US008090402B1

(12) United States Patent
Fujisaki

(10) Patent No.: US 8,090,402 B1
(45) Date of Patent: Jan. 3, 2012

(54) COMMUNICATION DEVICE

(76) Inventor: Iwao Fujisaki, Tokyo (JP)

( * ) Notice: Subject to any disclaimer, the term of this patent is extended or adjusted under 35 U.S.C. 154(b) by 1407 days.

(21) Appl. No.: 10/710,600

(22) Filed: Jul. 23, 2004

Related U.S. Application Data

(60) Provisional application No. 60/481,426, filed on Sep. 26, 2003.

(51) Int. Cl.
*H04M 1/00* (2006.01)

(52) U.S. Cl. ..................... 455/556.1; 455/551; 455/410; 455/456.1; 455/558

(58) Field of Classification Search ............... 455/556.1, 455/456.1, 558, 567, 410; 370/338; 705/26; 340/426.1
See application file for complete search history.

(56) References Cited

U.S. PATENT DOCUMENTS

| | | | |
|---|---|---|---|
| 4,934,773 | A | 6/1990 | Becker |
| 4,937,570 | A | 6/1990 | Matsukawa et al. |
| 5,113,427 | A | 5/1992 | Ryoichi et al. |
| 5,272,638 | A | 12/1993 | Martin et al. |
| 5,353,376 | A | 10/1994 | Oh et al. |
| 5,388,147 | A | 2/1995 | Grimes |
| 5,404,579 | A | 4/1995 | Obayashi et al. |
| 5,405,152 | A | 4/1995 | Katanics et al. |
| 5,414,461 | A | 5/1995 | Kishi et al. |
| 5,446,904 | A | 8/1995 | Belt et al. |
| 5,532,741 | A | 7/1996 | Tsutsumi |
| 5,542,557 | A | 8/1996 | Koyama et al. |
| 5,543,789 | A | 8/1996 | Behr et al. |
| 5,648,768 | A | 7/1997 | Bouve |
| 5,675,630 | A | 10/1997 | Beatty |
| 5,687,331 | A | 11/1997 | Volk et al. |
| 5,732,383 | A | 3/1998 | Foladare et al. |
| 5,758,280 | A | 5/1998 | Kimura |
| 5,772,586 | A | 6/1998 | Heinonen et al. |
| 5,778,304 | A | 7/1998 | Grube et al. |
| 5,802,460 | A | 9/1998 | Parvulescu et al. |
| 5,805,672 | A | 9/1998 | Barkat et al. |
| 5,812,930 | A | 9/1998 | Zavrel |
| 5,844,824 | A | 12/1998 | Newman et al. |
| 5,877,765 | A | 3/1999 | Dickman et al. |
| 5,902,349 | A | 5/1999 | Endo et al. |
| 5,916,024 | A | 6/1999 | Von Kohorn |
| 5,918,180 | A | 6/1999 | Dimino |
| 5,959,661 | A | 9/1999 | Isono |
| 5,983,245 | A | 11/1999 | Newman et al. |
| 6,009,336 | A | 12/1999 | Harris et al. |
| 6,011,973 | A | 1/2000 | Valentine et al. |
| 6,043,752 | A | 3/2000 | Hisada et al. |
| 6,081,265 | A | 6/2000 | Nakayama et al. |
| 6,091,409 | A | 7/2000 | Dickman et al. |
| 6,115,597 | A | 9/2000 | Kroll et al. |

(Continued)

FOREIGN PATENT DOCUMENTS

| | | | |
|---|---|---|---|
| GB | 2386027 A | * | 9/2003 |

(Continued)

*Primary Examiner* — David Q Nguyen

(57) ABSTRACT

A method for a communication device comprising the phone communication device remote controlling step, wherein, in response to the user entering the user instruction by the phone, the communication device receives a communication device controlling command via a network to which the communication device is connected in a wireless fashion, and the communication device implements a communication device controlling task in response to the communication device controlling command, thereby the communication device is remotely controlled via the user instruction entered by the phone, and thereby a communication device controlled notice which corresponds to the user instruction is output from the phone.

20 Claims, 1792 Drawing Sheets

U.S. PATENT DOCUMENTS

| | | | |
|---|---|---|---|
| 6,128,594 A | 10/2000 | Gulli et al. | |
| 6,144,848 A | 11/2000 | Walsh et al. | |
| 6,148,212 A * | 11/2000 | Park et al. | 455/456.1 |
| 6,189,018 B1 | 2/2001 | Newman et al. | |
| 6,198,942 B1 | 3/2001 | Hayashi et al. | |
| 6,202,060 B1 | 3/2001 | Tran | |
| 6,216,013 B1 | 4/2001 | Moore et al. | |
| 6,216,158 B1 | 4/2001 | Luo et al. | |
| 6,223,029 B1 | 4/2001 | Stenman et al. | |
| 6,225,944 B1 | 5/2001 | Hayes | |
| 6,236,832 B1 | 5/2001 | Ito | |
| 6,243,039 B1 | 6/2001 | Elliot | |
| 6,249,720 B1 | 6/2001 | Kubota et al. | |
| 6,253,075 B1 | 6/2001 | Beghtol et al. | |
| 6,265,988 B1 | 7/2001 | LeMense et al. | |
| 6,285,317 B1 | 9/2001 | Ong | |
| 6,292,666 B1 | 9/2001 | Siddiqui et al. | |
| 6,292,747 B1 | 9/2001 | Amro et al. | |
| 6,311,011 B1 | 10/2001 | Kuroda | |
| 6,311,077 B1 | 10/2001 | Bien | |
| 6,332,122 B1 | 12/2001 | Ortega et al. | |
| 6,333,684 B1 * | 12/2001 | Kang | 340/7.2 |
| 6,363,320 B1 | 3/2002 | Chou | |
| 6,366,651 B1 | 4/2002 | Griffith et al. | |
| 6,366,782 B1 | 4/2002 | Fumarolo et al. | |
| 6,374,221 B1 | 4/2002 | Haimi-Cohen | |
| 6,385,466 B1 | 5/2002 | Hirai et al. | |
| 6,385,541 B1 | 5/2002 | Blumberg et al. | |
| 6,405,033 B1 | 6/2002 | Kennedy, III et al. | |
| 6,411,198 B1 | 6/2002 | Hirai et al. | |
| 6,411,822 B1 | 6/2002 | Kraft | |
| 6,415,138 B2 | 7/2002 | Sirola et al. | |
| 6,421,470 B1 | 7/2002 | Nozaki et al. | |
| 6,421,602 B1 | 7/2002 | Bullock et al. | |
| 6,430,498 B1 | 8/2002 | Maruyama et al. | |
| 6,442,404 B1 | 8/2002 | Sakajiri | |
| 6,445,802 B1 | 9/2002 | Dan | |
| 6,477,387 B1 | 11/2002 | Jackson et al. | |
| 6,486,867 B1 | 11/2002 | Kopp et al. | |
| 6,487,422 B1 | 11/2002 | Lee | |
| 6,512,919 B2 | 1/2003 | Ogasawara | |
| 6,519,566 B1 | 2/2003 | Boyer et al. | |
| 6,526,293 B1 | 2/2003 | Matsuo | |
| 6,529,742 B1 | 3/2003 | Yang | |
| 6,532,035 B1 | 3/2003 | Saari et al. | |
| 6,538,558 B2 | 3/2003 | Sakazume et al. | |
| 6,542,750 B2 | 4/2003 | Hendrey et al. | |
| 6,542,814 B2 | 4/2003 | Polidi et al. | |
| 6,553,310 B1 | 4/2003 | Lopke | |
| 6,567,745 B2 | 5/2003 | Fuchs et al. | |
| 6,567,984 B1 | 5/2003 | Allport | |
| 6,600,975 B2 | 7/2003 | Moriguchi et al. | |
| 6,606,504 B1 * | 8/2003 | Mooney et al. | 455/567 |
| 6,611,753 B1 | 8/2003 | Millington | |
| 6,615,186 B1 * | 9/2003 | Kolls | 705/26 |
| 6,618,704 B2 | 9/2003 | Kanevsky et al. | |
| 6,622,018 B1 | 9/2003 | Erekson | |
| 6,631,271 B1 | 10/2003 | Logan | |
| 6,647,251 B1 | 11/2003 | Siegle et al. | |
| 6,650,877 B1 | 11/2003 | Tarbouriech et al. | |
| 6,650,894 B1 | 11/2003 | Berstis et al. | |
| 6,658,272 B1 | 12/2003 | Lenchik et al. | |
| 6,658,461 B1 | 12/2003 | Mazo | |
| 6,662,023 B1 * | 12/2003 | Helle | 455/558 |
| 6,681,120 B1 | 1/2004 | Kim | |
| 6,690,932 B1 | 2/2004 | Barnier et al. | |
| 6,701,148 B1 | 3/2004 | Wilson et al. | |
| 6,707,942 B1 | 3/2004 | Cortopassi et al. | |
| 6,711,399 B1 | 3/2004 | Granier | |
| 6,725,022 B1 | 4/2004 | Clayton et al. | |
| 6,728,531 B1 | 4/2004 | Lee et al. | |
| 6,738,643 B1 | 5/2004 | Harris | |
| 6,738,711 B2 | 5/2004 | Ohmura et al. | |
| 6,763,226 B1 | 7/2004 | McZeal, Jr. | |
| 6,772,174 B1 | 8/2004 | Pettersson | |
| 6,779,030 B1 | 8/2004 | Dugan et al. | |
| 6,788,928 B2 | 9/2004 | Kohinata et al. | |
| 6,795,715 B1 | 9/2004 | Kubo et al. | |
| 6,812,954 B1 | 11/2004 | Priestman et al. | |
| 6,819,939 B2 | 11/2004 | Masamura | |
| 6,820,055 B2 | 11/2004 | Saindon et al. | |
| 6,836,654 B2 | 12/2004 | Decotignie | |
| 6,865,372 B2 | 3/2005 | Mauney et al. | |
| 6,883,000 B1 | 4/2005 | Gropper | |
| 6,891,525 B2 | 5/2005 | Ogoro | |
| 6,895,084 B1 | 5/2005 | Saylor et al. | |
| 6,895,256 B2 | 5/2005 | Harma et al. | |
| 6,895,259 B1 | 5/2005 | Blank nee Keller et al. | |
| 6,898,321 B1 | 5/2005 | Knee et al. | |
| 6,898,765 B2 | 5/2005 | Matthews, III et al. | |
| 6,901,383 B1 | 5/2005 | Ricketts et al. | |
| 6,904,298 B2 | 6/2005 | Arai et al. | |
| 6,912,544 B1 * | 6/2005 | Weiner | 707/104.1 |
| 6,922,630 B2 | 7/2005 | Maruyama et al. | |
| 6,937,868 B2 | 8/2005 | Himmel et al. | |
| 6,947,728 B2 | 9/2005 | Tagawa et al. | |
| 6,954,645 B2 | 10/2005 | Tsai et al. | |
| 6,958,675 B2 | 10/2005 | Maeda et al. | |
| 6,961,559 B1 | 11/2005 | Chow et al. | |
| 6,968,184 B2 | 11/2005 | Criss et al. | |
| 6,968,206 B1 | 11/2005 | Whitsey-Anderson | |
| 6,992,699 B1 | 1/2006 | Vance et al. | |
| 6,999,802 B2 | 2/2006 | Kim | |
| 7,003,598 B2 | 2/2006 | Kavanagh | |
| 7,007,239 B1 | 2/2006 | Hawkins et al. | |
| 7,012,999 B2 | 3/2006 | Ruckart | |
| 7,028,077 B2 | 4/2006 | Toshimitsu et al. | |
| 7,035,666 B2 | 4/2006 | Silberfening | |
| 7,058,356 B2 | 6/2006 | Slotznick | |
| 7,076,052 B2 | 7/2006 | Yoshimura | |
| 7,081,832 B2 | 7/2006 | Nelson et al. | |
| 7,085,739 B1 | 8/2006 | Winter et al. | |
| 7,089,298 B2 | 8/2006 | Nyman et al. | |
| 7,106,846 B2 | 9/2006 | Nguyen et al. | |
| 7,117,152 B1 | 10/2006 | Mukherji et al. | |
| 7,117,504 B2 | 10/2006 | Smith et al. | |
| 7,126,951 B2 | 10/2006 | Belcea et al. | |
| 7,127,238 B2 | 10/2006 | Vandermeijden et al. | |
| 7,127,271 B1 | 10/2006 | Fujisaki | |
| 7,130,630 B1 | 10/2006 | Enzmann et al. | |
| 7,142,810 B2 | 11/2006 | Oesterling | |
| 7,142,890 B2 | 11/2006 | Irimajiri et al. | |
| 7,190,880 B2 | 3/2007 | Cookson et al. | |
| 7,218,916 B2 | 5/2007 | Nonami | |
| 7,224,851 B2 | 5/2007 | Kinjo | |
| 7,233,795 B1 | 6/2007 | Ryden | |
| 7,239,742 B2 | 7/2007 | Ohtani et al. | |
| 7,251,255 B1 | 7/2007 | Young | |
| 7,260,416 B2 | 8/2007 | Shippee | |
| 7,266,186 B1 | 9/2007 | Henderson | |
| 7,274,952 B2 | 9/2007 | Hayashi | |
| 7,346,373 B2 | 3/2008 | Kim | |
| 7,426,264 B1 | 9/2008 | Henderson | |
| 7,489,768 B1 | 2/2009 | Strietzel | |
| 7,551,899 B1 | 6/2009 | Nicolas et al. | |
| 2001/0000249 A1 | 4/2001 | Oba et al. | |
| 2001/0005826 A1 | 6/2001 | Shibuya | |
| 2001/0011293 A1 | 8/2001 | Murakami et al. | |
| 2001/0029425 A1 * | 10/2001 | Myr | 701/200 |
| 2001/0035829 A1 | 11/2001 | Yu et al. | |
| 2001/0037191 A1 | 11/2001 | Furuta et al. | |
| 2001/0041590 A1 | 11/2001 | Silberfenig et al. | |
| 2002/0002705 A1 * | 1/2002 | Byrnes et al. | 725/14 |
| 2002/0004701 A1 | 1/2002 | Nakano | |
| 2002/0006804 A1 | 1/2002 | Mukai et al. | |
| 2002/0016724 A1 | 2/2002 | Yang et al. | |
| 2002/0019225 A1 | 2/2002 | Miyashita | |
| 2002/0026348 A1 | 2/2002 | Fowler et al. | |
| 2002/0028690 A1 | 3/2002 | McKenna et al. | |
| 2002/0031120 A1 | 3/2002 | Rakib | |
| 2002/0034292 A1 | 3/2002 | Tuoriniemi et al. | |
| 2002/0036642 A1 | 3/2002 | Kwon et al. | |
| 2002/0038219 A1 | 3/2002 | Buchshrieber et al. | |
| 2002/0039914 A1 | 4/2002 | Hama et al. | |
| 2002/0047787 A1 | 4/2002 | Mikkola et al. | |
| 2002/0049742 A1 | 4/2002 | Chan et al. | |
| 2002/0055350 A1 | 5/2002 | Gupte et al. | |

2002/0058497 A1* 5/2002 Jeong .................... 455/410
2002/0058531 A1 5/2002 Terasaki et al.
2002/0065037 A1 5/2002 Messina et al.
2002/0065604 A1 5/2002 Sekiyama
2002/0066115 A1 5/2002 Wendelrup
2002/0068585 A1 6/2002 Chan et al.
2002/0068599 A1 6/2002 Rodriguez et al.
2002/0082059 A1 6/2002 Nariai et al.
2002/0085700 A1 7/2002 Metcalf
2002/0094806 A1 7/2002 Kamimura
2002/0098857 A1 7/2002 Ishii
2002/0102960 A1 8/2002 Lechner
2002/0103872 A1 8/2002 Watanabe
2002/0110246 A1 8/2002 Gosior et al.
2002/0115469 A1 8/2002 Rekimoto et al.
2002/0120589 A1 8/2002 Aoki
2002/0120718 A1 8/2002 Lee
2002/0122076 A1 9/2002 Nakaki
2002/0123336 A1 9/2002 Kamada
2002/0127997 A1 9/2002 Karlstedt et al.
2002/0133342 A1 9/2002 McKenna
2002/0137470 A1 9/2002 Baron et al.
2002/0137526 A1 9/2002 Shinohara
2002/0142763 A1 10/2002 Kolsky
2002/0147645 A1 10/2002 Alao et al.
2002/0151326 A1 10/2002 Awada et al.
2002/0151327 A1 10/2002 Levitt
2002/0154632 A1 10/2002 Wang et al.
2002/0157101 A1 10/2002 Schrader et al.
2002/0164996 A1 11/2002 Dorenbosch
2002/0165850 A1* 11/2002 Roberts et al. ................ 707/1
2002/0168959 A1 11/2002 Noguchi et al.
2002/0173344 A1 11/2002 Cupps et al.
2002/0177407 A1 11/2002 Mitsumoto
2002/0178009 A1 11/2002 Firman
2002/0178225 A1 11/2002 Madenberg et al.
2002/0183045 A1 12/2002 Emmerson et al.
2002/0191951 A1 12/2002 Sodeyama et al.
2002/0196378 A1 12/2002 Slobodin
2002/0198813 A1 12/2002 Patterson, Jr. et al.
2002/0198936 A1 12/2002 McIntyre et al.
2003/0003967 A1 1/2003 Ito
2003/0007556 A1 1/2003 Oura et al.
2003/0013483 A1 1/2003 Ausems et al.
2003/0014286 A1 1/2003 Cappellini
2003/0017857 A1 1/2003 Kitson et al.
2003/0018744 A1 1/2003 Johanson et al.
2003/0018748 A1 1/2003 McKenna
2003/0032389 A1 2/2003 Kim et al.
2003/0032406 A1 2/2003 Minear et al.
2003/0033214 A1 2/2003 Mikkelsen et al.
2003/0038800 A1 2/2003 Kawahara
2003/0045301 A1 3/2003 Wollrab
2003/0045311 A1 3/2003 Larikka et al.
2003/0045329 A1 3/2003 Kinoshita
2003/0045996 A1 3/2003 Yamazaki et al.
2003/0050776 A1 3/2003 Blair
2003/0052964 A1 3/2003 Priestman et al.
2003/0055994 A1 3/2003 Herrmann et al.
2003/0061606 A1 3/2003 Hartwig et al.
2003/0063732 A1 4/2003 Mcknight
2003/0065784 A1 4/2003 Herrod
2003/0065805 A1 4/2003 Barnes, Jr.
2003/0069693 A1 4/2003 Snapp et al.
2003/0073432 A1 4/2003 Meade, II
2003/0083055 A1 5/2003 Riordan et al.
2003/0083873 A1 5/2003 Ross et al.
2003/0084121 A1 5/2003 De Boor et al.
2003/0093503 A1* 5/2003 Yamaki et al. ............... 709/220
2003/0093790 A1 5/2003 Logan et al.
2003/0099367 A1* 5/2003 Okamura ..................... 381/77
2003/0100326 A1 5/2003 Grube et al.
2003/0107580 A1 6/2003 Egawa et al.
2003/0109251 A1 6/2003 Fujito et al.
2003/0114191 A1 6/2003 Nishimura
2003/0115240 A1 6/2003 Cho
2003/0117316 A1 6/2003 Tischer
2003/0119479 A1 6/2003 Arima et al.
2003/0119485 A1 6/2003 Ogasawara
2003/0119562 A1 6/2003 Kokubo
2003/0122779 A1 7/2003 Martin et al.
2003/0132928 A1 7/2003 Kori
2003/0135563 A1 7/2003 Bodin et al.
2003/0142957 A1 7/2003 Young et al.
2003/0148772 A1 8/2003 Ben-Ari
2003/0153364 A1* 8/2003 Osann, Jr. .................. 455/567
2003/0155413 A1 8/2003 Kovesdi et al.
2003/0157929 A1* 8/2003 Janssen et al. .............. 455/416
2003/0166399 A1 9/2003 Tokkonen et al.
2003/0171113 A1 9/2003 Choi
2003/0174685 A1* 9/2003 Hasebe ...................... 370/338
2003/0181201 A1 9/2003 Bomze et al.
2003/0184600 A1 10/2003 Lin-Hendel
2003/0204562 A1 10/2003 Hwang
2003/0220835 A1 11/2003 Barnes, Jr.
2003/0222762 A1 12/2003 Beigl et al.
2003/0224760 A1 12/2003 Day
2003/0227570 A1 12/2003 Kim et al.
2003/0229900 A1 12/2003 Reisman
2003/0236866 A1 12/2003 Light
2004/0003307 A1 1/2004 Tsuji
2004/0029640 A1 2/2004 Masuyama et al.
2004/0033795 A1 2/2004 Walsh et al.
2004/0034692 A1 2/2004 Eguchi et al.
2004/0082321 A1 4/2004 Kontianinen
2004/0103303 A1 5/2004 Yamauchi et al.
2004/0107072 A1 6/2004 Dietrich et al.
2004/0114732 A1 6/2004 Choe et al.
2004/0117108 A1 6/2004 Nemeth
2004/0137893 A1 7/2004 Muthuswamy et al.
2004/0137983 A1 7/2004 Kerr et al.
2004/0142678 A1 7/2004 Krasner
2004/0157664 A1 8/2004 Link
2004/0166832 A1 8/2004 Portman et al.
2004/0166879 A1 8/2004 Meadows et al.
2004/0174863 A1 9/2004 Caspi et al.
2004/0183937 A1 9/2004 Viinikanoja et al.
2004/0203490 A1 10/2004 Kaplan
2004/0203520 A1 10/2004 Schirtzinger et al.
2004/0203577 A1 10/2004 Forman et al.
2004/0203904 A1 10/2004 Gwon et al.
2004/0203909 A1 10/2004 Koster
2004/0204035 A1 10/2004 Raghuram et al.
2004/0204126 A1 10/2004 Reyes et al.
2004/0204821 A1 10/2004 Tu
2004/0204848 A1 10/2004 Matsuo et al.
2004/0209649 A1 10/2004 Lord
2004/0216037 A1 10/2004 Hishida et al.
2004/0218738 A1 11/2004 Arai et al.
2004/0219951 A1 11/2004 Holder
2004/0222988 A1 11/2004 Donnelly
2004/0235513 A1 11/2004 O'Connell
2004/0235520 A1 11/2004 Cadiz et al.
2004/0242269 A1 12/2004 Fadell
2004/0248586 A1 12/2004 Patel et al.
2004/0252197 A1 12/2004 Fraley et al.
2004/0257208 A1* 12/2004 Huang et al. ............. 340/426.1
2005/0004749 A1 1/2005 Park
2005/0020301 A1 1/2005 Lee
2005/0026629 A1 2/2005 Contractor
2005/0036509 A1 2/2005 Acharya et al.
2005/0048987 A1 3/2005 Glass
2005/0070257 A1 3/2005 Saarinen et al.
2005/0090768 A1 4/2005 Brattesani et al.
2005/0097038 A1 5/2005 Yu et al.
2005/0107119 A1 5/2005 Lee et al.
2005/0113080 A1 5/2005 Nishimura
2005/0120225 A1 6/2005 Kirsch et al.
2005/0136949 A1 6/2005 Barnes, Jr.
2005/0153681 A1 7/2005 Hanson
2005/0153745 A1 7/2005 Smethers
2005/0164684 A1 7/2005 Chen et al.
2005/0165871 A1 7/2005 Barrs, II et al.
2005/0166242 A1 7/2005 Matsumoto et al.
2005/0186954 A1 8/2005 Kenney
2005/0191969 A1 9/2005 Mousseau
2005/0235312 A1 10/2005 Karaoguz et al.
2005/0257149 A1 11/2005 Kamiya et al.

| | | | |
|---|---|---|---|
| 2005/0261945 | A1 | 11/2005 | Mougin et al. |
| 2006/0015819 | A1 | 1/2006 | Hawkins et al. |
| 2006/0031407 | A1 | 2/2006 | Dispensa et al. |
| 2006/0041923 | A1 | 2/2006 | McQuaide, Jr. |
| 2006/0052100 | A1 | 3/2006 | Almgren |
| 2006/0073820 | A1 | 4/2006 | Craswell et al. |
| 2006/0133590 | A1 | 6/2006 | Jiang |
| 2006/0140387 | A1 | 6/2006 | Boldt |
| 2006/0143655 | A1 | 6/2006 | Ellis et al. |
| 2006/0166650 | A1 | 7/2006 | Berger et al. |
| 2006/0206913 | A1 | 9/2006 | Jerding et al. |
| 2006/0234758 | A1 | 10/2006 | Parupudi et al. |
| 2006/0284732 | A1 | 12/2006 | Brock-Fisher |
| 2007/0061845 | A1 | 3/2007 | Barnes, Jr. |
| 2007/0109262 | A1 | 5/2007 | Oshima et al. |
| 2007/0135145 | A1 | 6/2007 | Lee et al. |
| 2007/0142047 | A1 | 6/2007 | Heeschen |
| 2007/0190944 | A1 | 8/2007 | Doan et al. |
| 2007/0204014 | A1 | 8/2007 | Greer et al. |
| 2007/0218891 | A1 | 9/2007 | Cox |
| 2007/0260456 | A1 | 11/2007 | Proux et al. |
| 2007/0262848 | A1 | 11/2007 | Berstis et al. |
| 2008/0014917 | A1 | 1/2008 | Rhoads et al. |
| 2008/0016526 | A1 | 1/2008 | Asmussen |
| 2008/0016534 | A1 | 1/2008 | Ortiz et al. |
| 2008/0058005 | A1 | 3/2008 | Zicker et al. |
| 2008/0194273 | A1 | 8/2008 | Kansal et al. |
| 2008/0242283 | A1 | 10/2008 | Ruckart |
| 2008/0250459 | A1 | 10/2008 | Roman |
| 2009/0197641 | A1 | 8/2009 | Rofougaran et al. |
| 2010/0030557 | A1 | 2/2010 | Molloy et al. |
| 2010/0099457 | A1 | 4/2010 | Kim |

FOREIGN PATENT DOCUMENTS

JP 02002252691 A * 9/2002

* cited by examiner

Fig. 8

Table #1

| | |
|---|---|
| Audio Info #1 | Scott |
| Audio Info #2 | Carol |
| Audio Info #3 | Peter |
| Audio Info #4 | Amy |
| Audio Info #5 | Brian |

Fig. 9

Table #2

| | |
|---|---|
| Scott | (916) 411-2526 |
| Carol | (418) 675-6566 |
| Peter | (220) 890-1567 |
| Amy | (615) 125-3411 |
| Brian | (042) 645-2097 |

Fig. 10

Table #A

| | |
|---|---|
| Audio Info #1 | (916) 411-2526 |
| Audio Info #2 | (418) 675-6566 |
| Audio Info #3 | (220) 890-1567 |
| Audio Info #4 | (615) 125-3411 |
| Audio Info #5 | (042) 645-2097 |

Area 267

Fig. 45

RAM 206

Table C

| | | |
|---|---|---|
| Phone #1 | Color A | Sound E |
| Phone #2 | Color B | Sound F |
| Phone #3 | Color C | Sound G |
| Phone #4 | Color D | Sound H |

| Key | Action |
|---|---|
| 1 | Move Up |
| 2 | Move Down |
| 3 | Move Left |
| 4 | Move Right |
| 5 | Jump |
| 6 | Dash |

Fig. 166

Database Hd

| <Type> | <Keyword> | Tel | <Loc> | Att.Inf |
|---|---|---|---|---|
| Store St1 | clean, big,... | xxxx | (x,y,z) | xxxx |
| Store St2 | cheap, ... | xxxx | (x,y,z) | xxxx |
| Rest. Rt1 | Chinese... | xxxx | (x,y,z) | xxxx |
| Rest. Rt2 | cheap, ... | xxxx | (x,y,z) | xxxx |
| Theater Th1 | SF, big,... | xxxx | (x,y,z) | xxxx |
| Theater Th2 | romance,... | xxxx | (x,y,z) | xxxx |
| Lodge Lg1 | xxx, xxx,... | xxxx | (x,y,z) | xxxx |
| Lodge Lg2 | xxx, xxx,... | xxxx | (x,y,z) | xxxx |
| Railway St. | | | | |
| Rst1 | xxx, xxx,... | xxxx | (x,y,z) | xxxx |
| Rst2 | xxx, xxx,... | xxxx | (x,y,z) | xxxx |
| Rst3 | xxx, xxx,... | xxxx | (x,y,z) | xxxx |
| Rst4 | xxx, xxx,... | xxxx | (x,y,z) | xxxx |
| Gas St. | | | | |
| Gst1 | xxx, xxx,... | xxxx | (x,y,z) | xxxx |
| Gst2 | xxx, xxx,... | xxxx | (x,y,z) | xxxx |

3D Map Storage Area
Hd1

Fig. 193

Customers' Ignition Key Code Storage Area Hh

| | |
|---|---|
| Automobile AM1 | Ignition Key Code IKC1 |
| Automobile AM2 | Ignition Key Code IKC2 |
| Automobile AM3 | Ignition Key Code IKC3 |
| Automobile AM4 | Ignition Key Code IKC4 |
| Automobile AM5 | Ignition Key Code IKC5 |
| Automobile AM6 | Ignition Key Code IKC6 |
| Automobile AM7 | Ignition Key Code IKC7 |
| Automobile AM8 | Ignition Key Code IKC8 |
| Automobile AM9 | Ignition Key Code IKC9 |

Fig. 197

Ignition Key Code Storage Area 2066c

| | |
|---|---|
| Automobile AMa<br>Automobile AMb<br>Automobile AMc | Ignition Key Code IKCa<br>Ignition Key Code IKCb<br>Ignition Key Code IKCc |

Fig. 199

Ignition Key Code Storage Area 2066c

| | |
|---|---|
| Automobile AMa | Ignition Key Code IKCa |
| Automobile AMb | Ignition Key Code IKCb |
| Automobile AMc | Ignition Key Code IKCc |
| Automobile AMd | Ignition Key Code IKCd |
| Automobile AMe | Ignition Key Code IKCe |
| Motorcycle MCa | Ignition Key Code IKCf |
| Motorcycle MCb | Ignition Key Code IKCg |
| Motorcycle MCc | Ignition Key Code IKCh |
| Entrance Dr ED | Key Code KCa |
| Back Door BD | Key Code KCb |
| Side Door SD | Key Code KCc |

Video/Photo Data Storage Area 20610a

Fig. 229

Indicator Data Storage
Area 20610g

| | |
|---|---|
| Video Mode | Red |
| Photo Mode | Green |

Fig. 230

Indicator Data Storage
Area 20610g

| | |
|---|---|
| Video Mode | ON/OFF |
| Photo Mode | ON/ON |

Fig. 254b

Taxi Data Storage Area H11b

| Taxi ID | **Current Location** | Status | **Destination** | Max Passenger # | Company | Rate |
|---|---|---|---|---|---|---|
| Taxi #1 | x1, y1, z1 | Occupied | x9, y9, z9 | 4 | A Taxi Corp. | $2/ mile |
| Taxi #2 | x2, y2, z2 | Occupied | x10, y10, z10 | 4 | A Taxi Corp. | $2/ mile |
| Taxi #3 | x3, y3, z3 | Vacant | Null | 4 | A Taxi Corp. | $2/ mile |
| Taxi #4 | x4, y4, z4 | Vacant | Null | 4 | A Taxi Corp. | $2/ mile |
| Taxi #5 | x5, y5, z5 | Occupied | x11, y11, z11 | 8 | B Taxi Corp. | $3/ mile |
| Taxi #6 | x6, y6, z6 | Occupied | x12, y12, z12 | 8 | B Taxi Corp. | $3/ mile |
| Taxi #7 | x7, y7, z7 | Vacant | Null | 4 | B Taxi Corp. | $3/ mile |
| Taxi #8 | x8, y8, z8 | Vacant | Null | 4 | B Taxi Corp. | $3/ mile |

Fig. 256

Estimated Information Data EID

Header EID1 / Caller ID EID2 / Host ID EID3 / Estimated Waiting Time Data x 5 Taxis EID4 / Estimated Price Data x 5 Taxis EID5 / Estimated Best Route Data EID6 / Footer EID7

Fig. 268

Updated Estimated Destination Arrival Time Data UEDATD

Header UEDATD1 / Caller ID UEDATD2 / Host ID UEDATD3 / Taxi ID UEDATD4 / Taxi Current Location Data UEDATD5 / 3D Map UEDATD6 / Estimated Destination Arrival Time Data UEDATD7 / Footer UEDATD8

Fig. 271

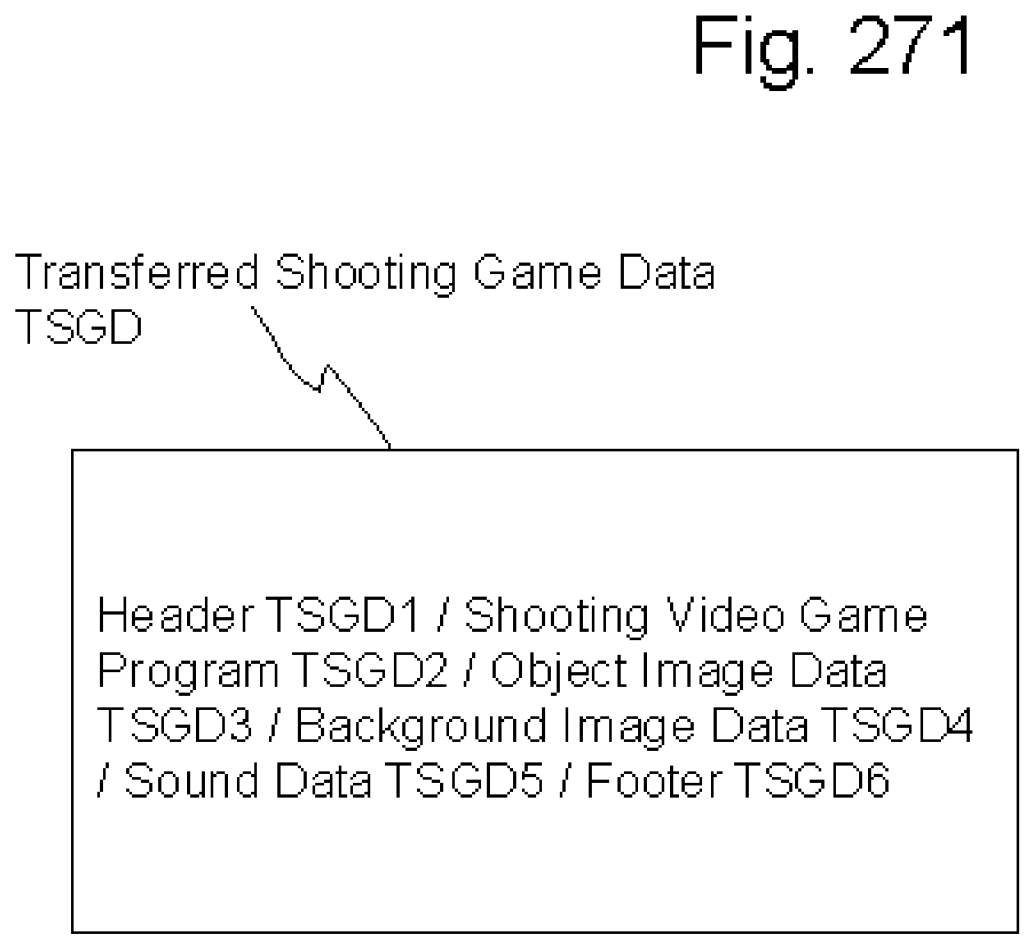

Transferred Shooting Game Data TSGD

Header TSGD1 / Shooting Video Game Program TSGD2 / Object Image Data TSGD3 / Background Image Data TSGD4 / Sound Data TSGD5 / Footer TSGD6

Fig. 285

Transferred Driving Game Data TDGD

Header TDGD1 / Driving Video Game Program TDGD2 / Driving Video Game Parameter TDGD3 / Object Image Data TDGD4 / Background Image Data TDGD5 / Street Image Data TDGD6 / Sound Data TDGD7 / Footer TDGD8

Fig. 301

Users' Address Book
Data Storage Area H12a

| | |
|---|---|
| User A | Address Book Data ABDa |
| User B | Address Book Data ABDb |
| User C | Address Book Data ABDc |
| User D | Address Book Data ABDd |
| User E | Address Book Data ABDe |

Fig. 302

Address Book Data ABDa

| | |
|---|---|
| User F | Address Data ADf |
| User G | Address Data ADg |
| User H | Address Data ADh |
| User I | Address Data ADi |
| User J | Address Data ADj |

Fig. 304

Address Book Data ABDa

| | |
|---|---|
| User F | Address Data ADf |
| User G | Address Data ADg |
| User H | Address Data ADh |
| User I | Address Data ADi |
| User J | Address Data ADj |
| User K | Address Data ADk (New Address) |

Fig. 307

Address Book Data Storage Area 20612c

| | |
|---|---|
| User F | Address Data ADf |
| User G | Address Data ADg |
| User H | Address Data ADh |
| User I | Address Data ADi |
| User J | Address Data ADj |

Fig. 309

Address Book Data Storage Area 20612c

| | |
|---|---|
| User F | Address Data ADf |
| User G | Address Data ADg |
| User H | Address Data ADh |
| User I | Address Data ADi |
| User J | Address Data ADj |
| User K | Address Data ADk (New Address) |

Fig. 311

Address Book Data ABDa

| | |
|---|---|
| User F | Address Data ADf |
| User G | Address Data ADg |
| User H | Address Data ADh |
| User I | Address Data ADi |
| User J | Address Data ADj (Modified) |

Fig. 312

Address Book Data Storage Area 20612c

| | |
|---|---|
| User F | Address Data ADf |
| User G | Address Data ADg |
| User H | Address Data ADh |
| User I | Address Data ADi |
| User J | Address Data ADj (Modified) |

Fig. 317

Users' Address Book
Data Storage Area H13a

| | |
|---|---|
| User A | Address Data ADa |
| User B | Address Data ADb |
| User C | Address Data ADc |
| User D | Address Data ADd |
| User E | Address Data ADe |

Fig. 319

Users' Address Book
Data Storage Area H13a

| | |
|---|---|
| User A | Address Data ADa |
| User B | Address Data ADb |
| User C | Address Data ADc |
| User D | Address Data ADd |
| User E | Address Data ADe |
| User F | Address Data ADf (New Address) |

Fig. 322

Address Book Data Storage Area 20613c

| | |
|---|---|
| User A | Address Data ADa |
| User B | Address Data ADb |
| User C | Address Data ADc |
| User D | Address Data ADd |
| User E | Address Data ADe |

Fig. 325

Address Book Data Storage Area 20613c

| | |
|---|---|
| User A | Address Data ADa |
| User B | Address Data ADb |
| User C | Address Data ADc |
| User D | Address Data ADd |
| User E | Address Data ADe |
| User F | Address Data ADf (New Address) |

Fig. 326

Users' Address Book
Data Storage Area H13a

| | |
|---|---|
| User A | Address Data ADa |
| User B | Address Data ADb |
| User C | Address Data ADc |
| User D | Address Data ADd |
| User E | Address Data ADe (Modified) |

Fig. 329

Address Book Data
Storage Area 20613c

| | |
|---|---|
| User A | Address Data ADa |
| User B | Address Data ADb |
| User C | Address Data ADc |
| User D | Address Data ADd |
| User E | Address Data ADe (Modified) |

Fig. 335

Scheduling Data Storage Area 20614c

| | |
|---|---|
| User A | Scheduling Data SchDa |
| User B | Scheduling Data SchDb |
| User C | Scheduling Data SchDc |

Fig. 337

Scheduling Data SchD

Subject: Meeting
Importance: B Rank
Date: 5/1
Day: Mon
Starting Time: 8:30AM
Ending Time: 11:30AM
Place: Room A
Memo: "Don't forget to bring the project paper."

Fig. 338

Scheduling Data SchD

Subject: Dinner With Mr. Green
Importance: A Rank
Date: 5/4
Day: Thur
Starting Time: 7:00PM
Ending Time: 8:00PM
Place: Chinese Restaurant Chou
Memo: "Don't forget to bring the credit card."

Fig. 339

Scheduling Data SchD

Subject: Meeting
Importance: A Rank
Date: 5/2
Day: Tue
Starting Time: 2:00PM
Ending Time: 7:00PM
Place: Room B
Memo: "Re: cancellation of project B."

Fig. 340

Scheduling Data SchD

Subject: Meeting
Importance: B Rank
Date: 5/1
Day: Mon
Starting Time: 2:00PM
Ending Time: 7:00PM
Place: Room C
Memo: "Consult CPA."

Fig. 342

Scheduling Data SchD

Subject: Lunch With Tom
Importance: C Rank
Date: 5/2
Day: Tue
Starting Time: 12:00PM
Ending Time: 1:00PM
Place: KFC
Memo: "Meet in front of KFC."

Fig. 345

Users' Scheduling Data
Storage Area H14a

| | |
|---|---|
| User A | Scheduling Data SchDa |
| User B | Scheduling Data SchDb |
| User C | Scheduling Data SchDc |

Fig. 378

TV Program Info
Storage Area H18b

| CH | Title | Sum | Start | Stop | Cat |
|---|---|---|---|---|---|
| 1 | XXX | XXXXXX | xx:xx | xx:xx | XXX |
| 1 | XXX | XXXXXX | xx:xx | xx:xx | XXX |
| 1 | XXX | XXXXXX | xx:xx | xx:xx | XXX |
| 1 | XXX | XXXXXX | xx:xx | xx:xx | XXX |
| 1 | XXX | XXXXXX | xx:xx | xx:xx | XXX |
| 2 | XXX | XXXXXX | xx:xx | xx:xx | XXX |
| 2 | XXX | XXXXXX | xx:xx | xx:xx | XXX |
| 2 | XXX | XXXXXX | xx:xx | xx:xx | XXX |
| 2 | XXX | XXXXXX | xx:xx | xx:xx | XXX |
| 2 | XXX | XXXXXX | xx:xx | xx:xx | XXX |
| 3 | XXX | XXXXXX | xx:xx | xx:xx | XXX |
| 3 | XXX | XXXXXX | xx:xx | xx:xx | XXX |
| 3 | XXX | XXXXXX | xx:xx | xx:xx | XXX |
| 3 | XXX | XXXXXX | xx:xx | xx:xx | XXX |
| 3 | XXX | XXXXXX | xx:xx | xx:xx | XXX |
| 4 | XXX | XXXXXX | xx:xx | xx:xx | XXX |
| 4 | XXX | XXXXXX | xx:xx | xx:xx | XXX |
| 4 | XXX | XXXXXX | xx:xx | xx:xx | XXX |
| 4 | XXX | XXXXXX | xx:xx | xx:xx | XXX |
| 4 | XXX | XXXXXX | xx:xx | xx:xx | XXX |

Fig. 379

TV Program Listing
Storage Area H18c

| CH | Title | Start | Stop |
|---|---|---|---|
| 1 | XXX | xx:xx | xx:xx |
| 1 | XXX | xx:xx | xx:xx |
| 1 | XXX | xx:xx | xx:xx |
| 1 | XXX | xx:xx | xx:xx |
| 1 | XXX | xx:xx | xx:xx |
| 2 | XXX | xx:xx | xx:xx |
| 2 | XXX | xx:xx | xx:xx |
| 2 | XXX | xx:xx | xx:xx |
| 2 | XXX | xx:xx | xx:xx |
| 2 | XXX | xx:xx | xx:xx |
| 3 | XXX | xx:xx | xx:xx |
| 3 | XXX | xx:xx | xx:xx |
| 3 | XXX | xx:xx | xx:xx |
| 3 | XXX | xx:xx | xx:xx |
| 3 | XXX | xx:xx | xx:xx |
| 4 | XXX | xx:xx | xx:xx |
| 4 | XXX | xx:xx | xx:xx |
| 4 | XXX | xx:xx | xx:xx |
| 4 | XXX | xx:xx | xx:xx |
| 4 | XXX | xx:xx | xx:xx |

PDWR Sound Selection Data Storage Area 20620c

Fig. 450

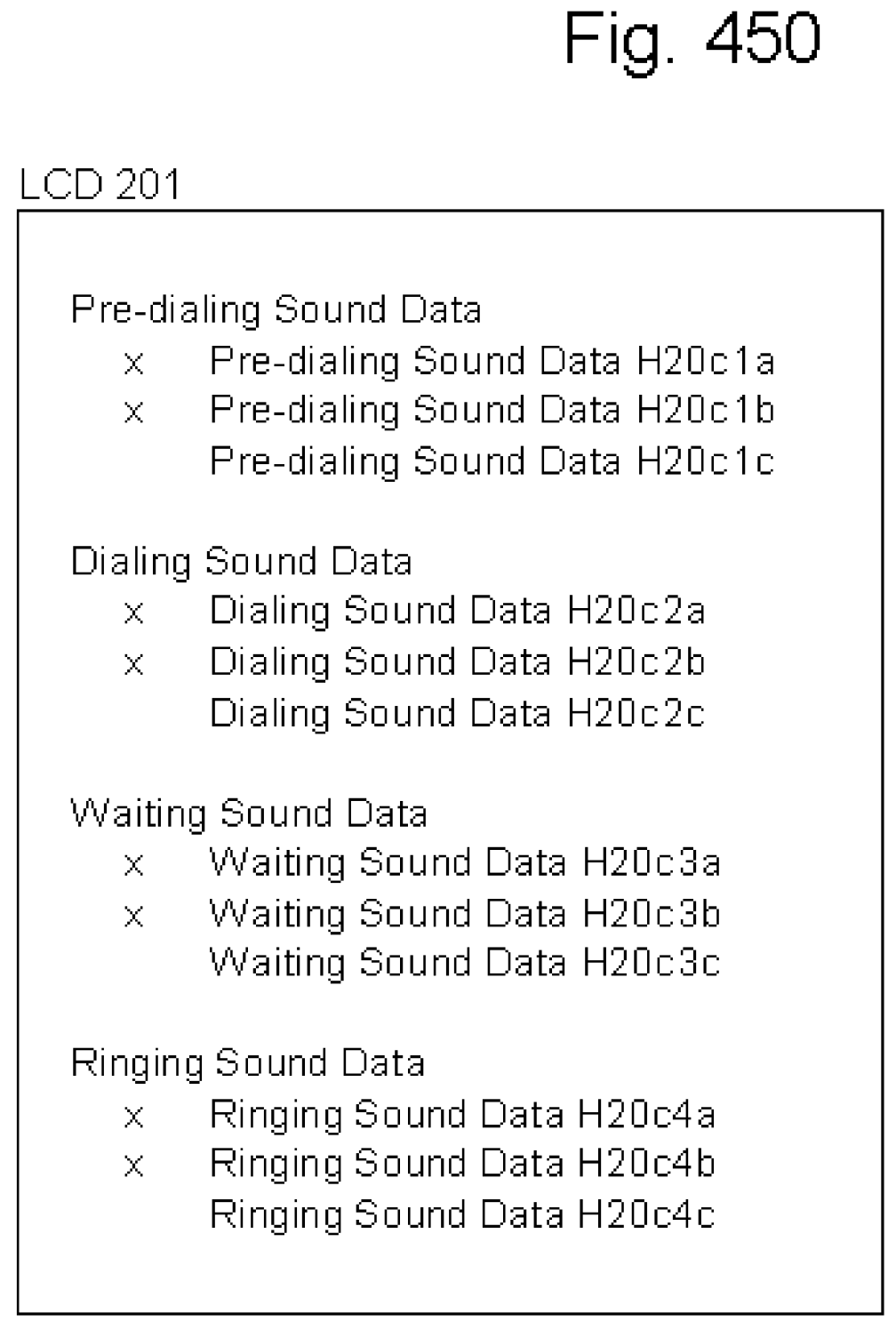

LCD 201

Pre-dialing Sound Data

- x Pre-dialing Sound Data H20c1a
- x Pre-dialing Sound Data H20c1b
- Pre-dialing Sound Data H20c1c Dialing Sound Data

- x Dialing Sound Data H20c2a
- x Dialing Sound Data H20c2b
- Dialing Sound Data H20c2c Waiting Sound Data

- x Waiting Sound Data H20c3a
- x Waiting Sound Data H20c3b
- Waiting Sound Data H20c3c Ringing Sound Data

- x Ringing Sound Data H20c4a
- x Ringing Sound Data H20c4b
- Ringing Sound Data H20c4c

Fig. 451

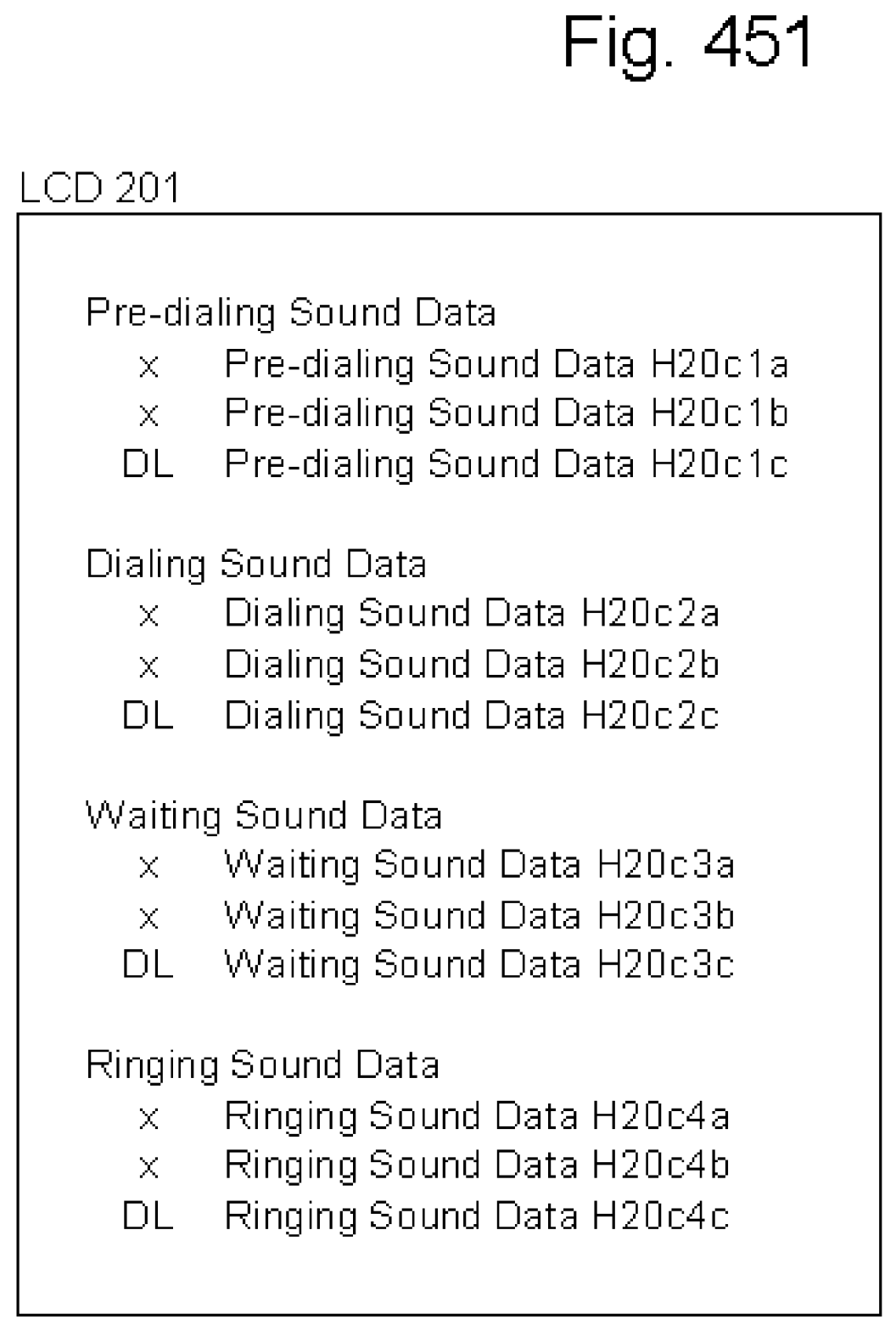

LCD 201

Pre-dialing Sound Data
x Pre-dialing Sound Data H20c1a
x Pre-dialing Sound Data H20c1b
DL Pre-dialing Sound Data H20c1c Dialing Sound Data
x Dialing Sound Data H20c2a
x Dialing Sound Data H20c2b
DL Dialing Sound Data H20c2c Waiting Sound Data
x Waiting Sound Data H20c3a
x Waiting Sound Data H20c3b
DL Waiting Sound Data H20c3c Ringing Sound Data
x Ringing Sound Data H20c4a
x Ringing Sound Data H20c4b
DL Ringing Sound Data H20c4c

Fig. 453

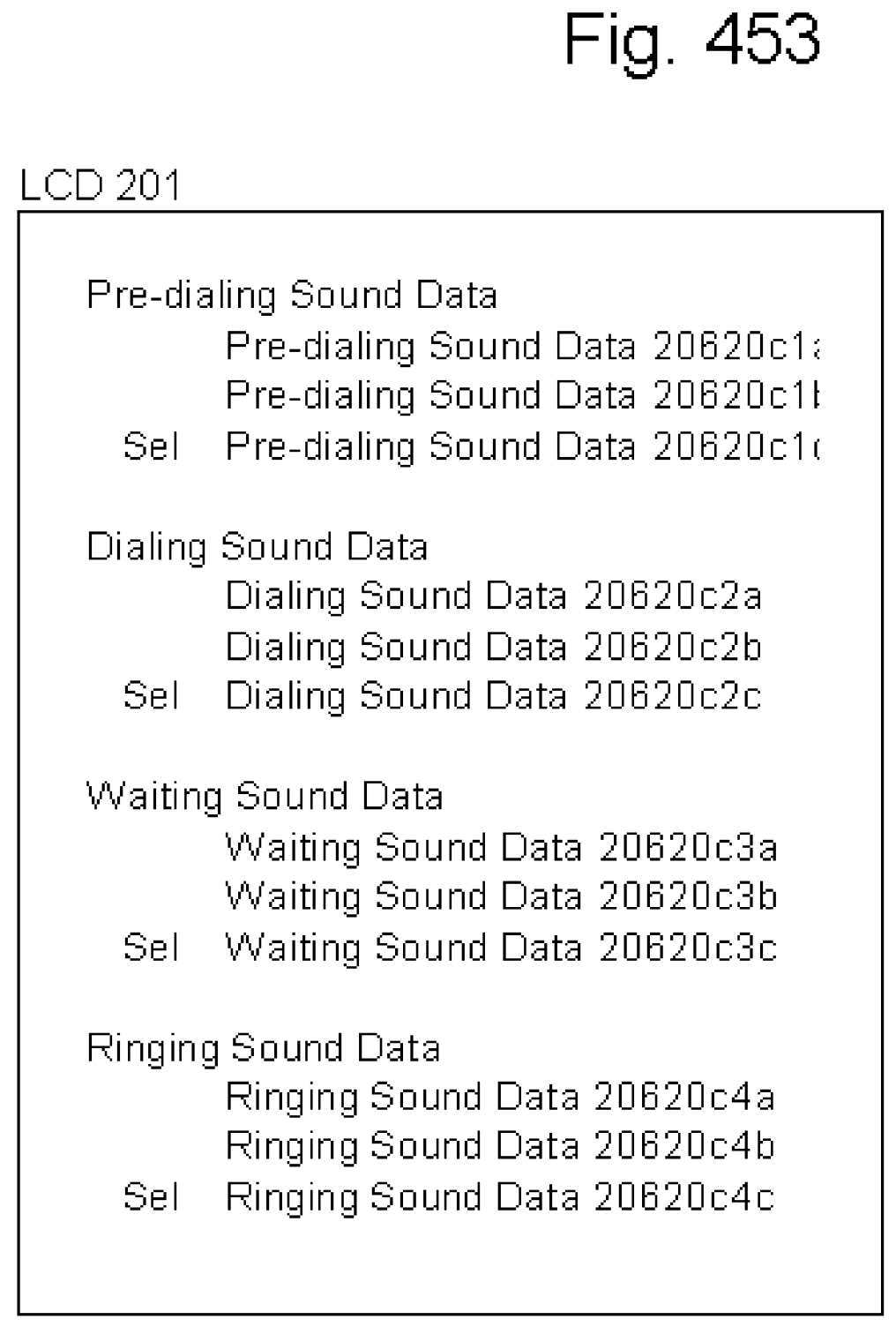

LCD 201

Pre-dialing Sound Data
Pre-dialing Sound Data 20620c1a
Pre-dialing Sound Data 20620c1b
Sel Pre-dialing Sound Data 20620c1c Dialing Sound Data
Dialing Sound Data 20620c2a
Dialing Sound Data 20620c2b
Sel Dialing Sound Data 20620c2c Waiting Sound Data
Waiting Sound Data 20620c3a
Waiting Sound Data 20620c3b
Sel Waiting Sound Data 20620c3c Ringing Sound Data
Ringing Sound Data 20620c4a
Ringing Sound Data 20620c4b
Sel Ringing Sound Data 20620c4c Stereo Visual Data Storage Area H23c CDMA2000 Signal Processor 20824a

LCD 201

Multiple Signal Processing Software Storage Area 20624b

Fig. 545a

Relay Location Data Storage Area H25c5

| Relay ID | Location Data | Reference Data |
|---|---|---|
| R51 | x51,y51,z51 | Bldg #5,Flr #3,Rm #1 |
| R52 | x52,y52,z52 | Bldg #5,Flr #3,Rm #1 |
| R53 | x53,y53,z53 | Bldg #5,Flr #3,Rm #1 |
| R54 | x54,y54,z54 | Bldg #5,Flr #3,Rm #1 |
| R55 | x55,y55,z55 | Bldg #5,Flr #3,Crdr #1 |
| R56 | x56,y56,z56 | Bldg #5,Flr #3,Crdr #1 |
| R57 | x57,y57,z57 | Bldg #5,Flr #3,Crdr #1 |
| R58 | x58,y58,z58 | Bldg #5,Flr #3,Crdr #1 |
| R59 | x59,y59,z59 | Bldg #5,Flr #3,Crdr #1 |
| R60 | x60,y60,z60 | Bldg #5,Flr #3,Crdr #1 |
| R61 | x61,y61,z61 | Bldg #5,Flr #3,Crdr #1 |
| R62 | x62,y62,z62 | Bldg #5,Flr #3,Crdr #1 |
| R63 | x63,y63,z63 | Bldg #5,Flr #3,Crdr #1 |

Fig. 549a

Relay Location Data Storage Area 20625c5

| Location Data | Reference Data |
|---|---|
| x51,y51,z51 | Bldg #5,Flr #3,Rm #1 |
| x52,y52,z52 | Bldg #5,Flr #3,Rm #1 |
| x53,y53,z53 | Bldg #5,Flr #3,Rm #1 |
| x54,y54,z54 | Bldg #5,Flr #3,Rm #1 |

Fig. 557

Account Data Storage Area
H20626c

| User ID | Password | Hardware ID |
|---|---|---|
| USID#1 | PW#1 | HID#1 |
| USID#2 | PW#2 | HID#2 |
| USID#3 | PW#3 | HID#3 |
| USID#4 | PW#4 | HID#4 |
| USID#5 | PW#5 | HID#5 |
| USID#6 | PW#6 | HID#6 |
| USID#7 | PW#7 | HID#7 |
| USID#8 | PW#8 | HID#8 |

Fig. 571

Bar Code Pattern Data Storage Area
H27b1

| Pattern ID PTI | Image PTIm | Corresponding Data CPD |
|---|---|---|
| PTI#1 | PTIm#1 | CPD#1 |
| PTI#2 | PTIm#2 | CPD#2 |
| PTI#3 | PTIm#3 | CPD#3 |
| PTI#4 | PTIm#4 | CPD#4 |
| PTI#5 | PTIm#5 | CPD#5 |
| PTI#6 | PTIm#6 | CPD#6 |
| PTI#7 | PTIm#7 | CPD#7 |
| PTI#8 | PTIm#8 | CPD#8 |
| PTI#9 | PTIm#9 | CPD#9 |
| PTI#10 | PTIm#10 | CPD#10 |

Fig. 578

Bar Code Pattern Data Storage Area
20627b1

| Pattern ID PTI | Image PTIm | Corresponding Data CPD |
|---|---|---|
| PTI#1 | PTIm#1 | CPD#1 |
| PTI#2 | PTIm#2 | CPD#2 |
| PTI#3 | PTIm#3 | CPD#3 |
| PTI#4 | PTIm#4 | CPD#4 |
| PTI#5 | PTIm#5 | CPD#5 |
| PTI#6 | PTIm#6 | CPD#6 |
| PTI#7 | PTIm#7 | CPD#7 |
| PTI#8 | PTIm#8 | CPD#8 |
| PTI#9 | PTIm#9 | CPD#9 |
| PTI#10 | PTIm#10 | CPD#10 |

Fig. 588

Registration Data Storage Area H28b2

| User ID | Status |
|---|---|
| User #1 | 1 |
| User #2 | 1 |
| User #3 | 0 |
| User #4 | 1 |

LCD 201

Fig. 618

LCD 201

Sub-category 20628CTG2

Jazz
Classic
Rock
Pops

Fig. 637

Police Department Location Data Storage Area H29b1

| Police Dept ID | Location Data | Phone # |
|---|---|---|
| H29PD #1 | H29LD #1 | H29PN #1 |
| H29PD #2 | H29LD #2 | H29PN #2 |
| H29PD #3 | H29LD #3 | H29PN #3 |
| H29PD #4 | H29LD #4 | H29PN #4 |

Fig. 691

Data Transfer Initiation Signal 20631TIS

Communication Device ID 20631TIS1 / Personal Computer PC#1 ID 20631TIS2 / Personal Computer PC#2 ID 20631TIS3 / PC#1 Directory 20631TIS4 / PC#1 Transferring Data File Name 20631TIS5 / PC#2 Directory 20631TIS6

Fig. 692a

PC#1 Transferring Data PC#1TD

Communication Device ID PC#1TD1 / Personal Computer PC#1 ID PC#1TD2 / Personal Computer PC#2 ID PC#1TD3 / PC#1 Directory PC#1TD4 / PC#1 Transferring Data File Name PC#1TD5 / PC#2 Directory PC#1TD6 / PC#1 Transferring Data PC#1TD7

Fig. 706

Message Data Storage Area 20632b2

Start Message Text Data 20632b2a
Stop Message Text Data 20632b2b
Pause Message Text Data 20632b2c
Resume Message Text Data 20632b2c1
Slow Replay Message Text Data 20632b2d
Fast-Forward Message Text Data 20632b2e
Fast-Rewind Message Text Data 20632b2f
Next Message Text Data 20632b2g
Previous Message Text Data 20632b2h

Fig. 707

Audiovisual Playback Software Storage Area 20632c

Audiovisual Start Software 20632c1
Audiovisual Stop Software 20632c2
Audiovisual Pause Software 20632c3
Audiovisual Resume Software 20632c3a
Audiovisual Slow Replay Software 20632c4
Audiovisual Fast-Forward Software 20632c5
Audiovisual Fast-Rewind Software 20632c6
Audiovisual Next Software 20632c7
Audiovisual Previous Software 20632c8
Audiovisual Selecting Software 20632c9

LCD 201

| | | |
|---|---|---|
| Start | --> | Start Message Text Data 20632b2a |
| Stop | --> | Stop Message Text Data 20632b2b |
| Pause | --> | Pause Message Text Data 20632b2c |
| Resume | --> | Resume Message Text Data 20632b2c1 |
| Slow Reply | --> | Slow Replay Message Text Data 20632b2d |
| Fast-Forward | --> | Fast-Forward Message Text Data 20632b2e |
| Fast-Rewind | --> | Fast-Rewind Message Text Data 20632b2f |
| Next | --> | Next Message Text Data 20632b2g |
| Previous | --> | Previous Message Text Data 20632b2h |

Fig. 721

Message Data Storage Area 20633b2

Start Message Text Data 20633b2a
Stop Message Text Data 20633b2b
Pause Message Text Data 20633b2c
Resume Message Text Data 20633b2c1
Slow Replay Message Text Data 20633b2d
Fast-Forward Message Text Data 20633b2e
Fast-Rewind Message Text Data 20633b2f
Next Message Text Data 20633b2g
Previous Message Text Data 20633b2h

Fig. 722

Audio Playback Software Storage Area 20633c

Audio Start Software 20633c1
Audio Stop Software 20633c2
Audio Pause Software 20633c3
Audio Resume Software 20633c3a
Audio Slow Replay Software 20633c4
Audio Fast-Forward Software 20633c5
Audio Fast-Rewind Software 20633c6
Audio Next Software 20633c7
Audio Previous Software 20633c8
Audio Selecting Software 20633c9

LCD 201

| | | |
|---|---|---|
| Start | --> | Start Message Text Data 20633b2a |
| Stop | --> | Stop Message Text Data 20633b2b |
| Pause | --> | Pause Message Text Data 20633b2c |
| Resume | --> | Resume Message Text Data 20633b2c1 |
| Slow Reply | --> | Slow Replay Message Text Data 20633b2d |
| Fast-Forward | --> | Fast-Forward Message Text Data 20633b2e |
| Fast-Rewind | --> | Fast-Rewind Message Text Data 20633b2f |
| Next | --> | Next Message Text Data 20633b2g |
| Previous | --> | Previous Message Text Data 20633b2h |

Fig. 735

Credit Card Data Storage Area 20634b1

Name
Credit Card Number
Expiration Date
Billing Address
Phone Number

Fig. 736

Ticket Purchasing Software Storage Area 20634c

Credit Card Data Input Software 20634c1
Ticket Data Displaying Software 20634c2
Ticket Data Selecting Software 20634c3
Purchase Data Sending Software
Purchased Ticket Data Processing Software 20634c5
Purchased Ticket Data Transferring Software 20634c6

Fig. 740

Credit Card Data Storage Area H34b1

| User ID | Credit Card Data | Purchase Confirma-tion Number | Ticket ID |
|---|---|---|---|
| H34UID1 | H34CCD1 | H34TPCN1 | H34TID1 |
| H34UID2 | H34CCD2 | | |
| H34UID3 | H34CCD3 | | |
| H34UID4 | H34CCD4 | | |

Fig. 741

Ticket Data Storage Area H34b2

| Ticket ID | Ticket Title | Ticket Descrip-tion | Price Data |
|---|---|---|---|
| H34TID1 | H34TT1 | H34TD1 | H34PD1 |
| H34TID2 | H34TT2 | H34TD2 | H34PD2 |
| H34TID3 | H34TT3 | H34TD3 | H34PD3 |
| H34TID4 | H34TT4 | H34TD4 | H34PD4 |

Remote Data Erasing Info Storage Area H35a

Fig. 761

To-Be-Erased Storage Area Data
Storage Area H35b1

| User ID | To-Be-Erased Storage Area Data |
|---|---|
| H35b1a | 20635TBE1 |
| H35b1b | Null |
| H35b1c | Null |

Fig. 779

User's Business Card Data Storage Area 20636b1

| |
|---|
| Name<br>Title<br>Department<br>Phone Number<br>Fax Number<br>Email Address<br>Office Address |

Fig. 780

Other Users' Business Card Data
Storage Area 20636b2

| User ID | Business Card Data |
|---|---|
| 20636UI1 | 20636CD1 |
| 20636UI2 | 20636CD2 |
| 20636UI3 | 20636CD3 |
| 20636UI4 | 20636CD4 |

Fig. 790

Part-timer Data Storage Area H38b1

| Part-timer ID | Available Working Time | Available Working Place | Mobile Phone # | Email Address |
|---|---|---|---|---|
| H38b1PI1 | H38b1AWT1 | H38b1AWP1 | H38b1MP1 | H38b1EA1 |
| H38b1PI2 | H38b1AWT2 | H38b1AWP2 | H38b1MP2 | H38b1EA2 |
| H38b1PI3 | H38b1AWT3 | H38b1AWP3 | H38b1MP3 | H38b1EA3 |
| H38b1PI4 | H38b1AWT4 | H38b1AWP4 | H38b1MP4 | H38b1EA4 |
| H38b1PI5 | H38b1AWT5 | H38b1AWP5 | H38b1MP5 | H38b1EA5 |
| H38b1PI6 | H38b1AWT6 | H38b1AWP6 | H38b1MP6 | H38b1EA6 |
| H38b1PI7 | H38b1AWT7 | H38b1AWP7 | H38b1MP7 | H38b1EA7 |

Fig. 791

Job Request Data Storage Area H38b2

| Requested Working Time | Requested Working Place |
|---|---|
| H38b2RWT1 | H38b2RWP1 |

Fig. 798

Part-timer Data Storage Area 20638b1

| Part-timer ID | Available Working Time | Available Worker Place | Mobile Phone # | Email Address | Requested Working Time | Requested Working Place |
|---|---|---|---|---|---|---|
| H38b1PI1 | H38b1AWT1 | H38b1AWP1 | H38b1MP1 | H38b1EA1 | H38b2RWT1 | H38b2RWP1 |

Fig. 805

Parking Lot Data Storage Area PLC39b

| Parking Lot ID | Total Spaces | Vacancy Data | Street Address | Location Data |
|---|---|---|---|---|
| PL39a | PL39b1TS1 | PL39b1VD1 | PL39b1SA1 | PL39b1LD1 |

Fig. 811

Parking Lot Data Storage Area H39b1

| Parking Lot ID | Total Spaces | Vacancy Data | Street Address | Location Data |
|---|---|---|---|---|
| PL39a | PL39b1TS1 | PL39b1VD1 | PL39b1SA | PL39b1LD1 |
| PL39b | PL39b1TS2 | PL39b1VD2 | PL39b1SA | PL39b1LD2 |
| PL39c | PL39b1TS3 | PL39b1VD3 | PL39b1SA | PL39b1LD3 |

Fig. 816

Parking Lot Data Storage Area 20639b1

| Parking Lot ID | Total Spaces | Vacancy Data | Street Address | Location Data |
|---|---|---|---|---|
| PL39a | PL39b1TS1 | PL39b1VD | PL39b1SA1 | PL39b1LD |
| PL39b | PL39b1TS2 | PL39b1VD | PL39b1SA2 | PL39b1LD |
| PL39c | PL39b1TS3 | PL39b1VD | PL39b1SA3 | PL39b1LD |

Parking Lot Finding Software Storage Area 20639c

Fig. 837

TV Program Data Storage Area H40b1

| Channel ID | TV Program Data |
| --- | --- |
| H40ChID1 | H40TPD1 |
| H40ChID2 | H40TPD2 |
| H40ChID3 | H40TPD3 |
| H40ChID4 | H40TPD4 |
| H40ChID5 | H40TPD5 |

Fig. 838

TV Program Data H40TPD1

| Time (Min) | TV Program Packet Data |
|---|---|
| 0 | H40TPD1a |
| 1 | H40TPD1b |
| 2 | H40TPD1c |
| 3 | H40TPD1d |
| 4 | H40TPD1e |
| 5 | H40TPD1f |
| 6 | H40TPD1g |
| 7 | H40TPD1h |
| 8 | H40TPD1i |
| 9 | H40TPD1j |
| 10 | H40TPD1k |

On Demand TV Data Storage Area 20640b

Fig. 843

TV Program Data Storage Area
20640b1

| Channel ID | TV Program Packet Data |
|---|---|
| H40ChID1 | H40TPD1f |

Fig. 859a

User ID Storage Area H41b4

| User ID |
| --- |
| ID#1 |
| ID#2 |
| ID#3 |
| ID#4 |
| ID#5 |

Fig. 860

Answer Data Storage Area H41b1

| User ID | Answer Data |
|---|---|
| ID#1 | Yes |
| ID#2 | Yes |
| ID#3 | Yes |
| ID#4 | Yes |
| ID#5 | No |

Fig. 861

Question Data Storage Area H41b2

| Question ID | Question Data |
|---|---|
| Q#1 | Are you older than 30? |
| Q#2 | Do you support the President? |
| Q#3 | Do you own more than 2 cars? |

Fig. 862

Counting Data Storage Area H41b3

| Choice Data | Sub-total Data |
|---|---|
| Yes | 4 |
| No | 1 |

Fig. 867

Question Data Storage Area 20641b1

| Question ID | Question Data |
| --- | --- |
| Q#1 | Are you older than 30? |

Fig. 868

Answer Data Storage Area 20641b3

| Question ID | Answer Data |
|---|---|
| Q#1 | Yes |

Fig. 869

Counting Data Storage Area 20641b3

| Choice Data | Sub-total Data |
|---|---|
| Yes | 4 |
| No | 1 |

Fig. 885

Display Controlling Data Storage Area
20642b

| File/Software ID | Display Controlling Data | |
|---|---|---|
| | Brightness Value | Contrast Value |
| File #1 | 20642BV1 | 20642CV1 |
| File #2 | 20642BV2 | 20642CV2 |
| File #3 | 20642BV1 | 20642CV3 |
| Software #1 | 20642BV2 | 20642CV1 |
| Software #2 | 20642BV3 | 20642CV2 |

Fig. 897

Parties Data Storage Area 20643b1

| User ID | Name | Phone Number |
|---|---|---|
| User #1 | John Doe | 916-455-1293 |
| User #2 | Jane Doe | 408-222-3653 |
| User #3 | Peter Pan | 418-313-9587 |
| User #4 | Marry Goround | 215-650-2121 |

Fig. 898

Selected Parties Data Storage Area
20643b2

| User ID |
| --- |
| User #1 |
| User #2 |
| User #3 |

Fig. 909

Parties Data Storage Area H43b1

| User ID | Name | Phone Number |
|---|---|---|
| User #1 | John Doe | 916-455-1293 |
| User #2 | Jane Doe | 408-222-3653 |
| User #3 | Peter Pan | 418-313-9587 |
| User #4 | Marry Goround | 215-650-2121 |

Fig. 910

Selected Parties Data Storage Area H43b2

| User ID |
|---|
| User #1 |
| User #2 |
| User #3 |

Fig. 920

Display Brightness Controlling Data Storage Area 20644b

| Photometer Value | Brightness Value |
|---|---|
| 1 | 3 |
| 2 | 2 |
| 3 | 1 |

Fig. 939a

Relay Location Data Storage Area H45c5

| Relay ID | Location Data | Reference Data |
|---|---|---|
| R51 | x51,y51,z51 | Bldg #5,Flr #3,Rm #1 |
| R52 | x52,y52,z52 | Bldg #5,Flr #3,Rm #1 |
| R53 | x53,y53,z53 | Bldg #5,Flr #3,Rm #1 |
| R54 | x54,y54,z54 | Bldg #5,Flr #3,Rm #1 |
| R55 | x55,y55,z55 | Bldg #5,Flr #3,Rm #1 |
| R56 | x56,y56,z56 | Bldg #5,Flr #3,Rm #1 |
| R57 | x57,y57,z57 | Bldg #5,Flr #3,Rm #1 |
| R58 | x58,y58,z58 | Bldg #5,Flr #3,Rm #1 |
| R59 | x59,y59,z59 | Bldg #5,Flr #3,Rm #1 |
| R60 | x60,y60,z60 | Bldg #5,Flr #3,Rm #1 |
| R61 | x61,y61,z61 | Bldg #5,Flr #3,Rm #1 |
| R62 | x62,y62,z62 | Bldg #5,Flr #3,Rm #1 |
| R63 | x63,y63,z63 | Bldg #5,Flr #3,Rm #1 |

RAM 206

Fig. 943a

Relay Location Data Storage Area 20645c5

| Relay ID | Location Data | Reference Data |
|---|---|---|
| R51 | x51,y51,z51 | Bldg #5,Flr #3,Rm #1 |
| R52 | x52,y52,z52 | Bldg #5,Flr #3,Rm #1 |
| R53 | x53,y53,z53 | Bldg #5,Flr #3,Rm #1 |
| R54 | x54,y54,z54 | Bldg #5,Flr #3,Rm #1 |

Fig. 953

Photo Data Storage Area 20646b1

| Photo ID | Photo Data |
|---|---|
| Photo #1 | 46PD1 |
| Photo #2 | 46PD2 |
| Photo #3 | 46PD3 |
| Photo #4 | 46PD4 |
| Photo #5 | 46PD5 |

Fig. 971

Phone Number Data Storage Area
20647b1

| Phone Number ID | Phone Number Data |
|---|---|
| PN #1 | (916)455-1293 |
| PN #2 | (408)424-9387 |
| PN #3 | (544)293-2938 |

Fig. 989

Window Data Storage Area 20648b1

| Window ID | Reference Point Data | Width Data | Height Data | Priority Data | Icon ID |
|---|---|---|---|---|---|
| Window #1 | 2cm, 3cm | 5cm | 2cm | Priority #4 | Icon #1 |
| Window #2 | 1cm, 2cm | 4cm | 4cm | Priority #3 | Icon #2 |
| Window #3 | 1cm, 2cm | 5cm | 6cm | Priority #2 | Icon #3 |
| Window #4 | 2cm, 3cm | 4cm | 5cm | Priority #1 | Icon #4 |

Fig. 999

Mouse Pointer Image Data Storage Area 20649b1

| Pointer ID | Pointer Image Data |
|---|---|
| Pointer #1 | Pointer Image Data #1 |
| Pointer #2 | Pointer Image Data #2 |
| Pointer #3 | Pointer Image Data #3 |
| Pointer #4 | Pointer Image Data #4 |

Fig. 1000

Current Pointer Data Storage Area
20649b2

| Selected Pointer ID | Current Location Data |
|---|---|
| Pointer #1 | 2cm, 3cm |

Fig. 1001
Mouse Pointer Displaying Software Storage Area 20649c
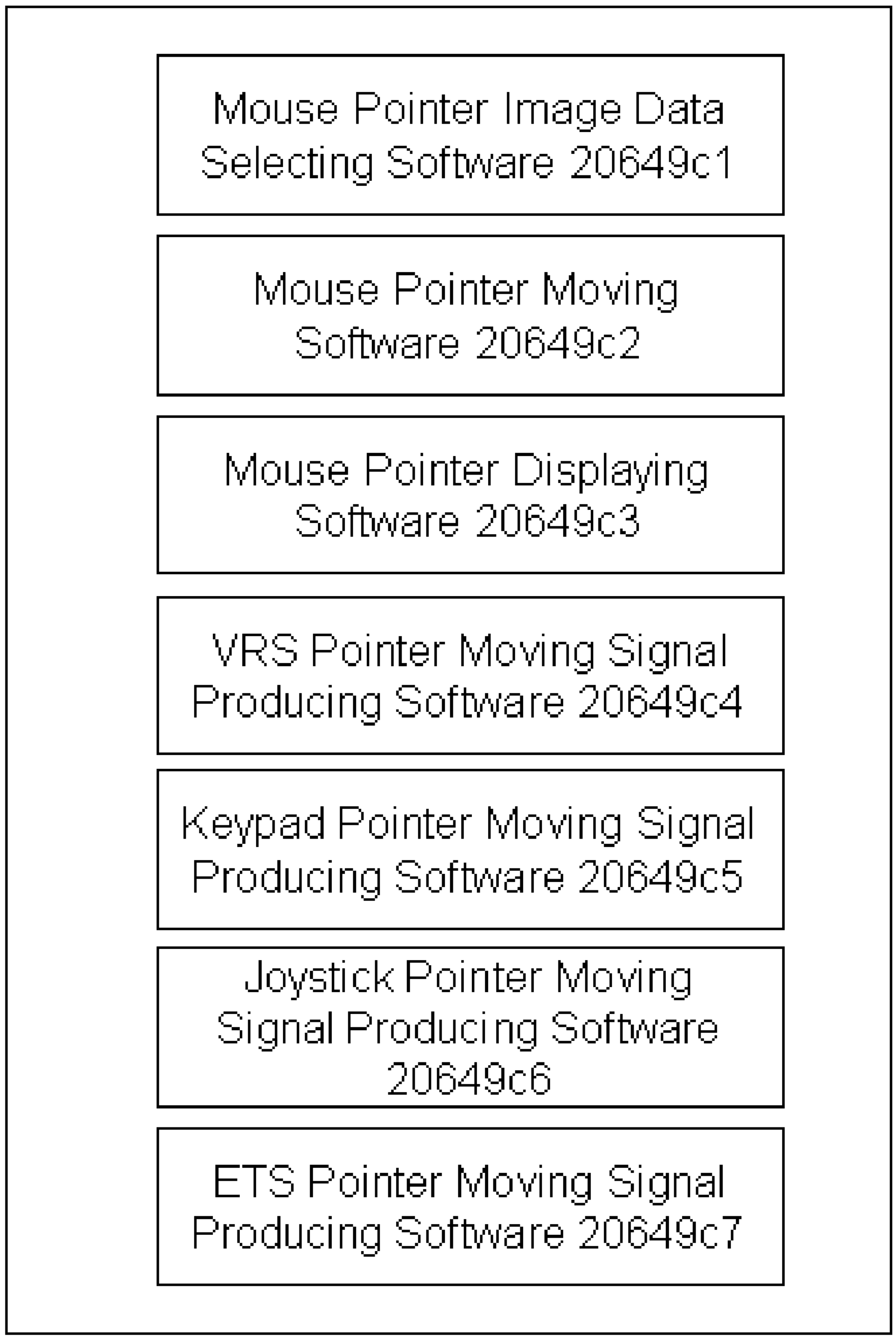

Fig. 1002
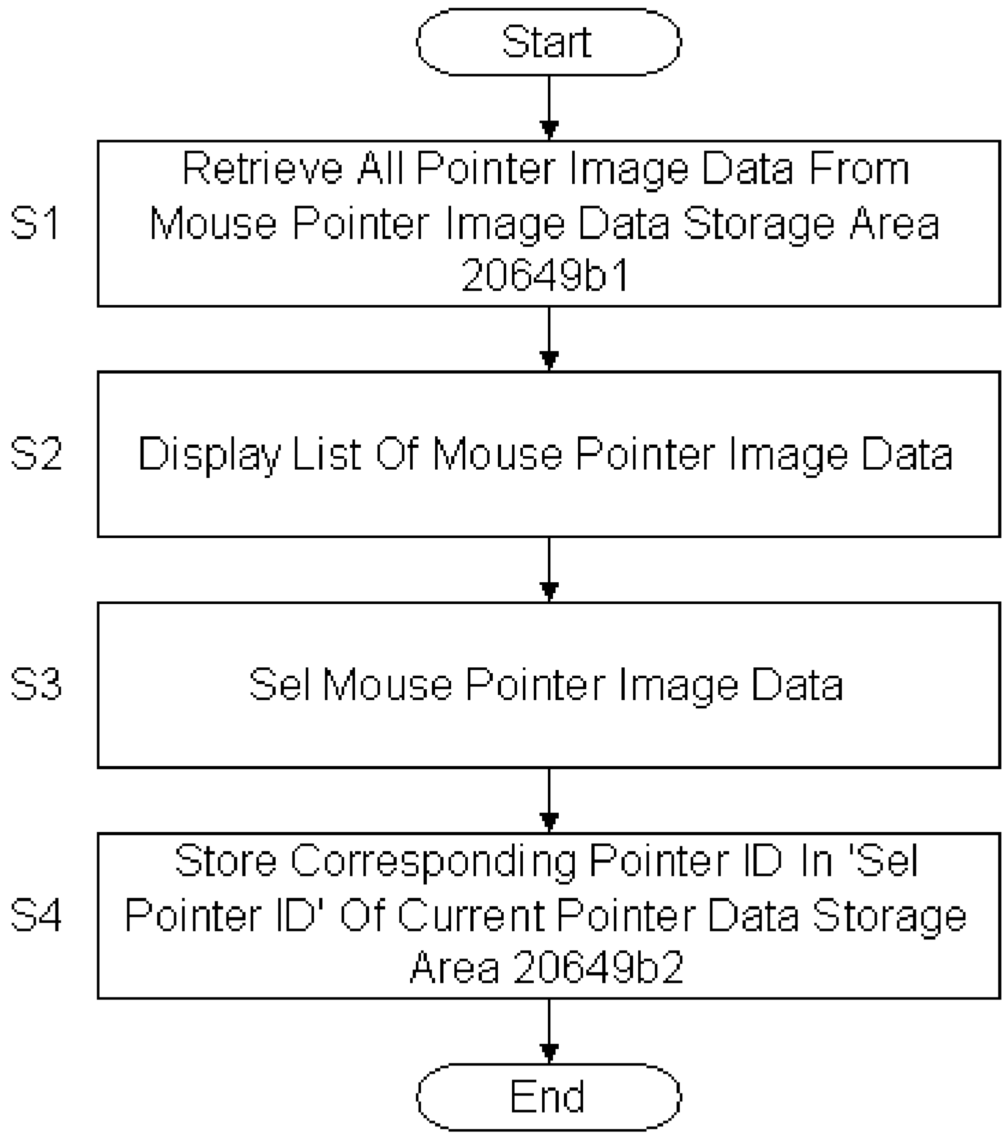

Fig. 1003
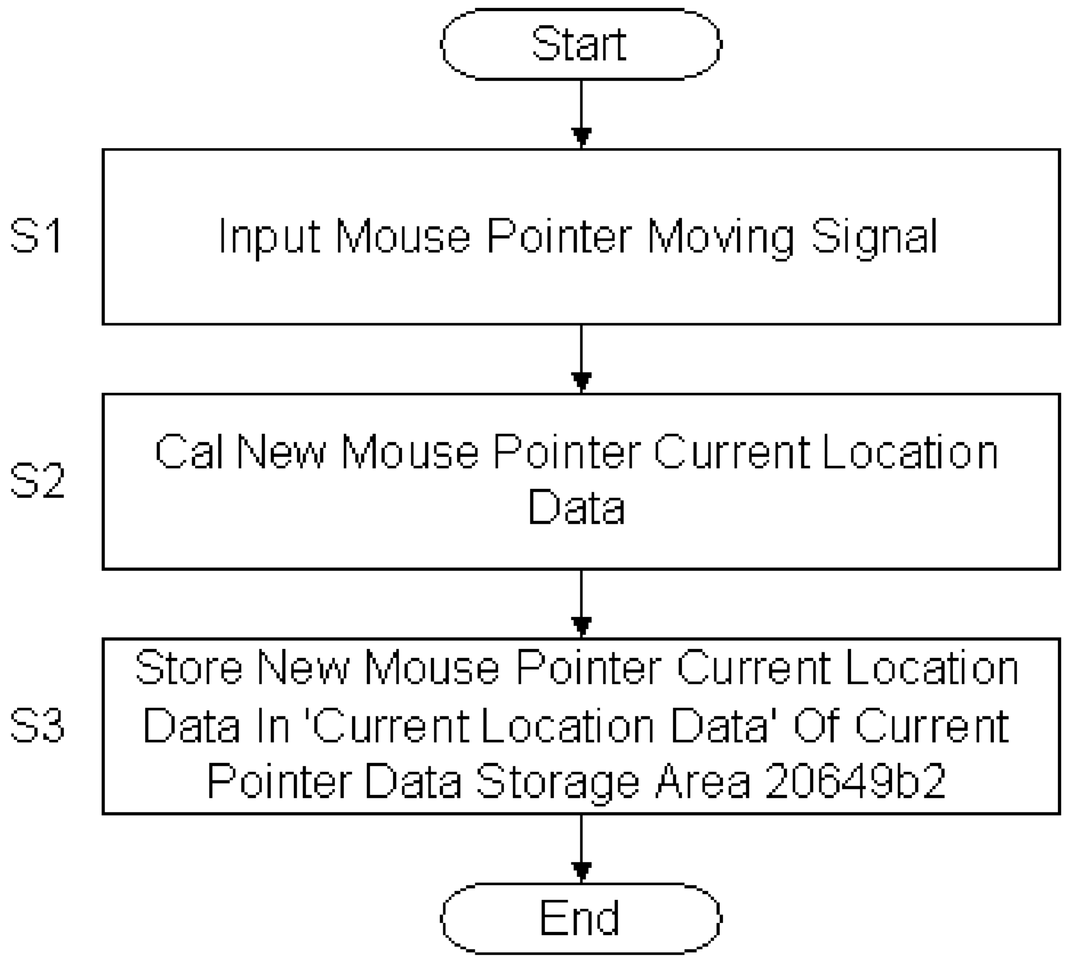

Fig. 1004
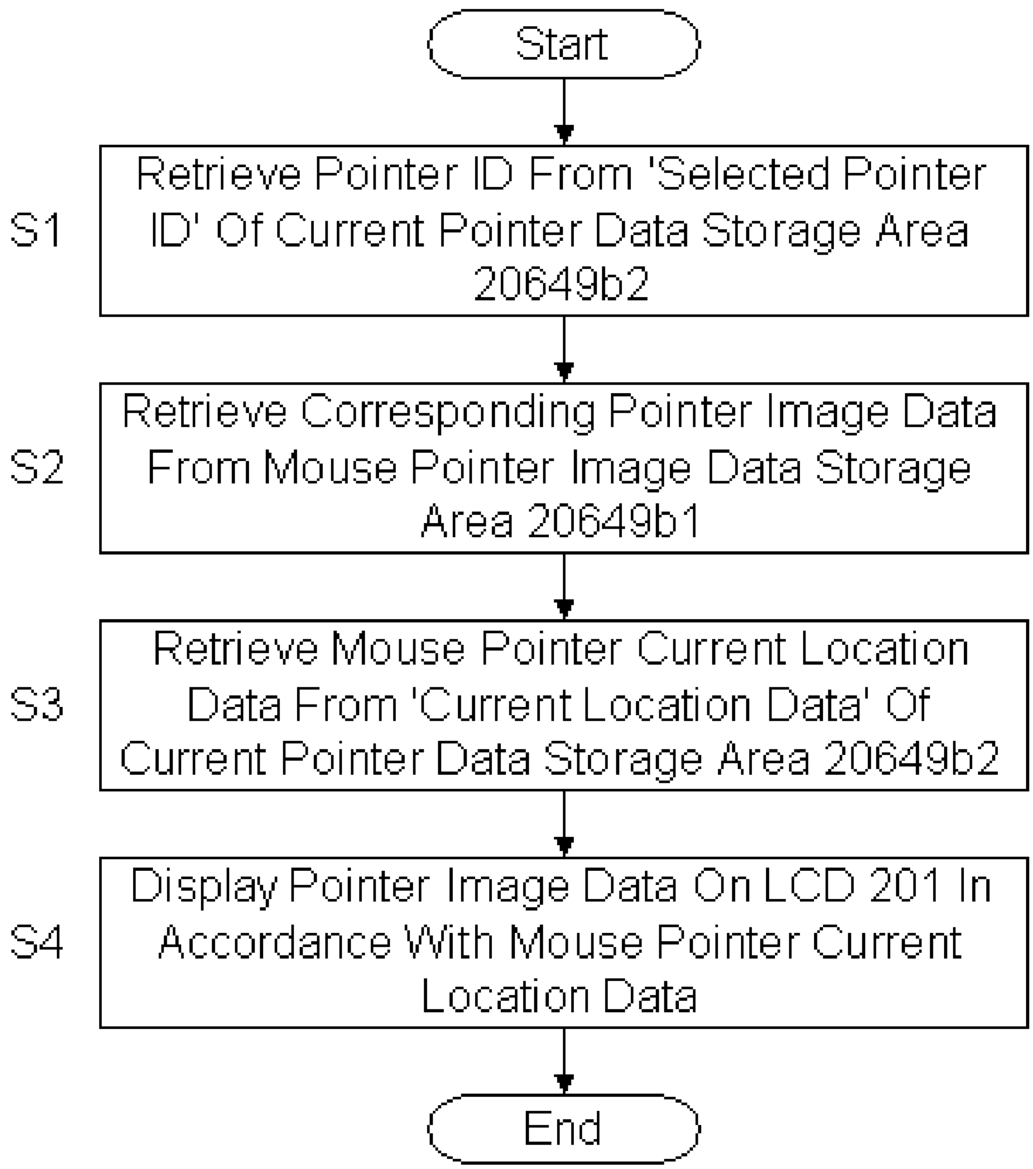

Fig. 1005
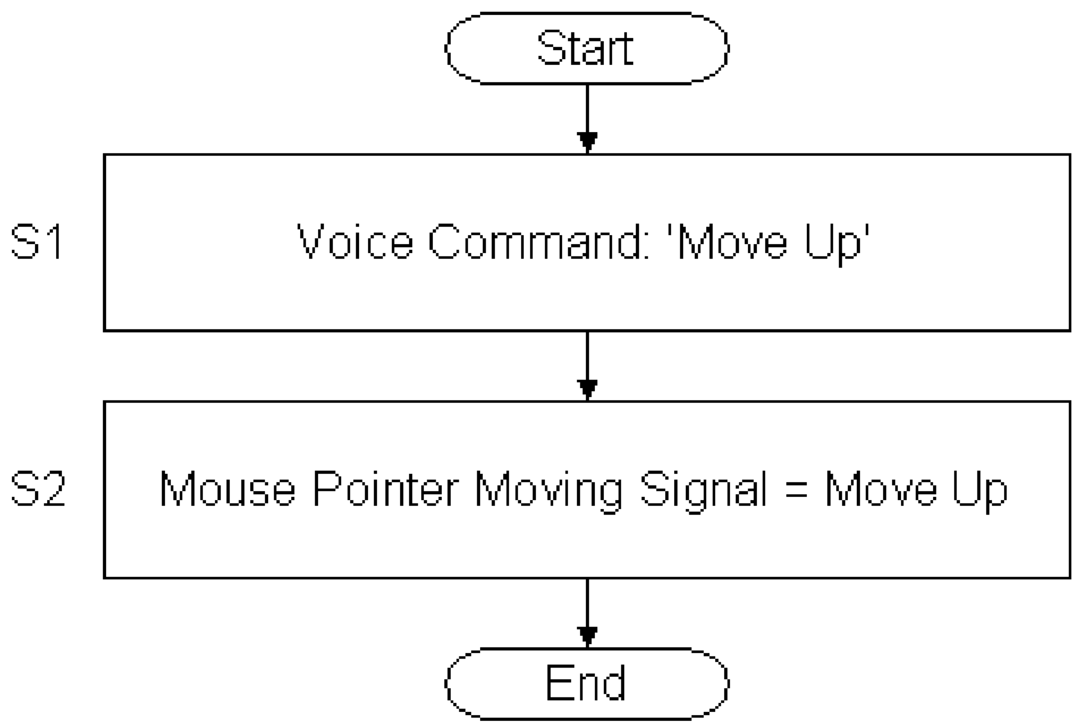

Fig. 1006
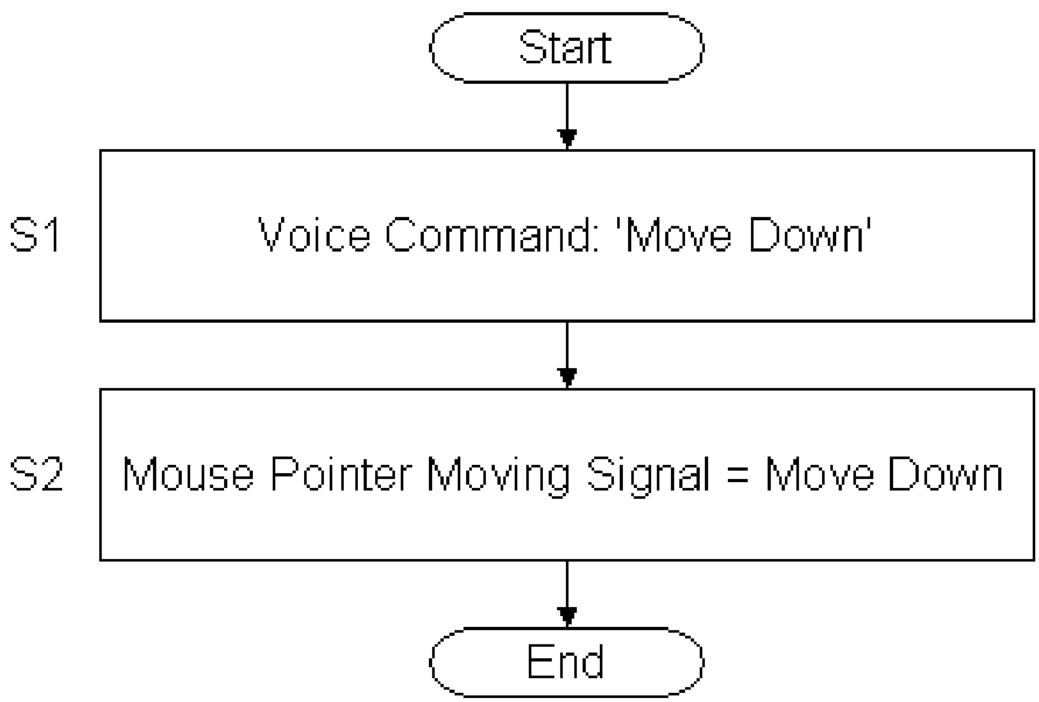

Fig. 1007
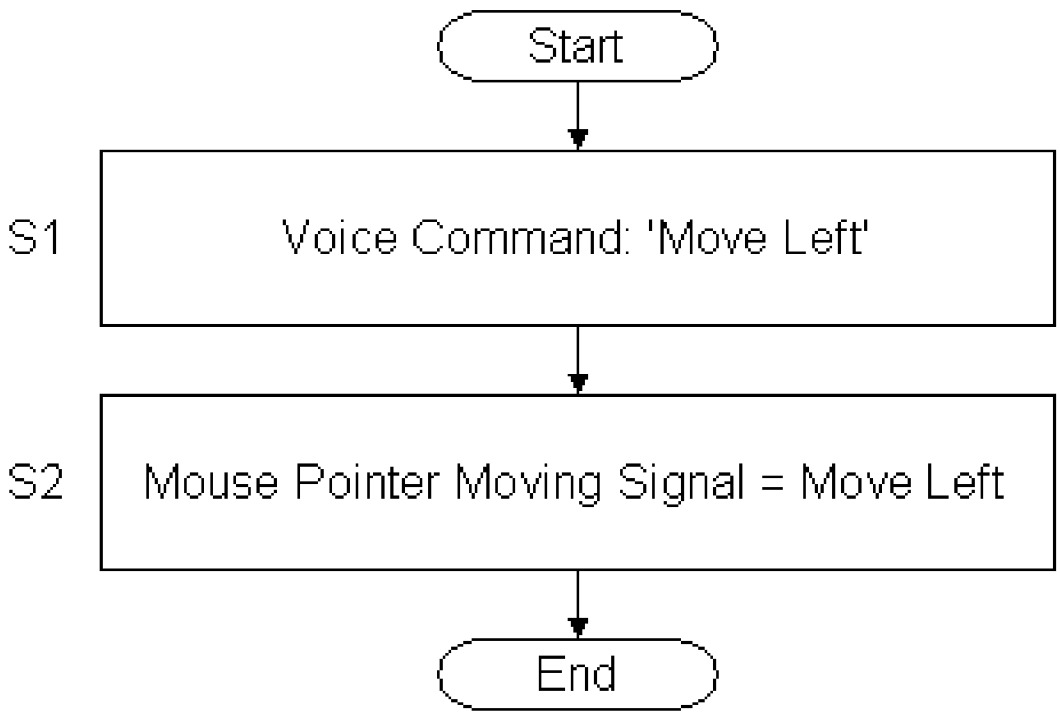

Fig. 1008
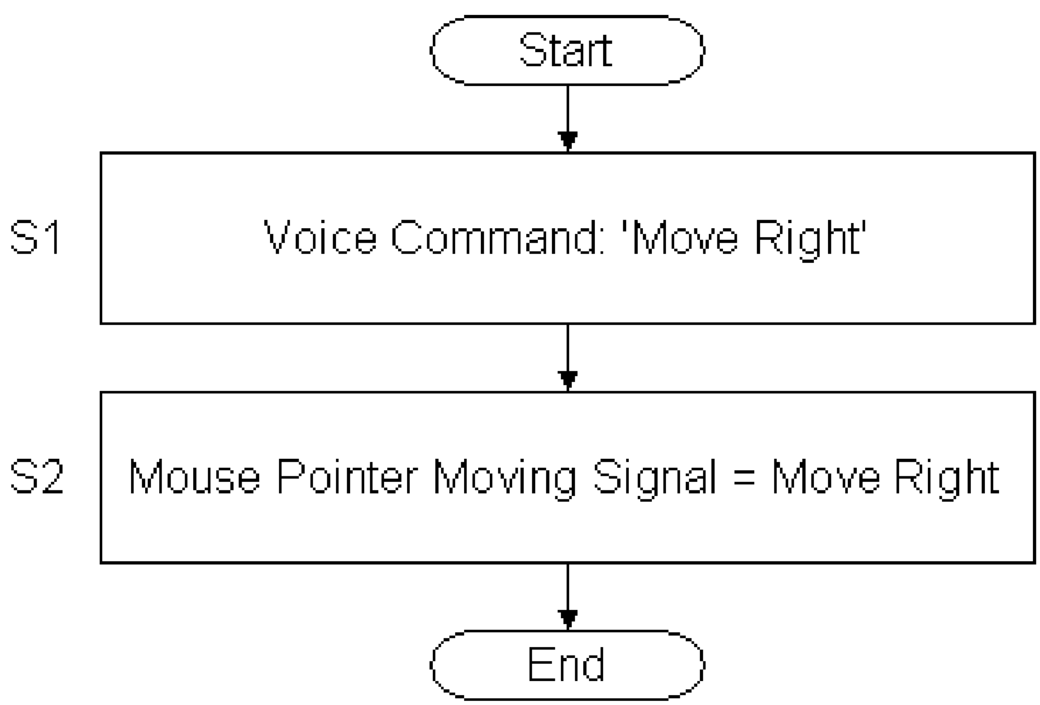

Fig. 1009
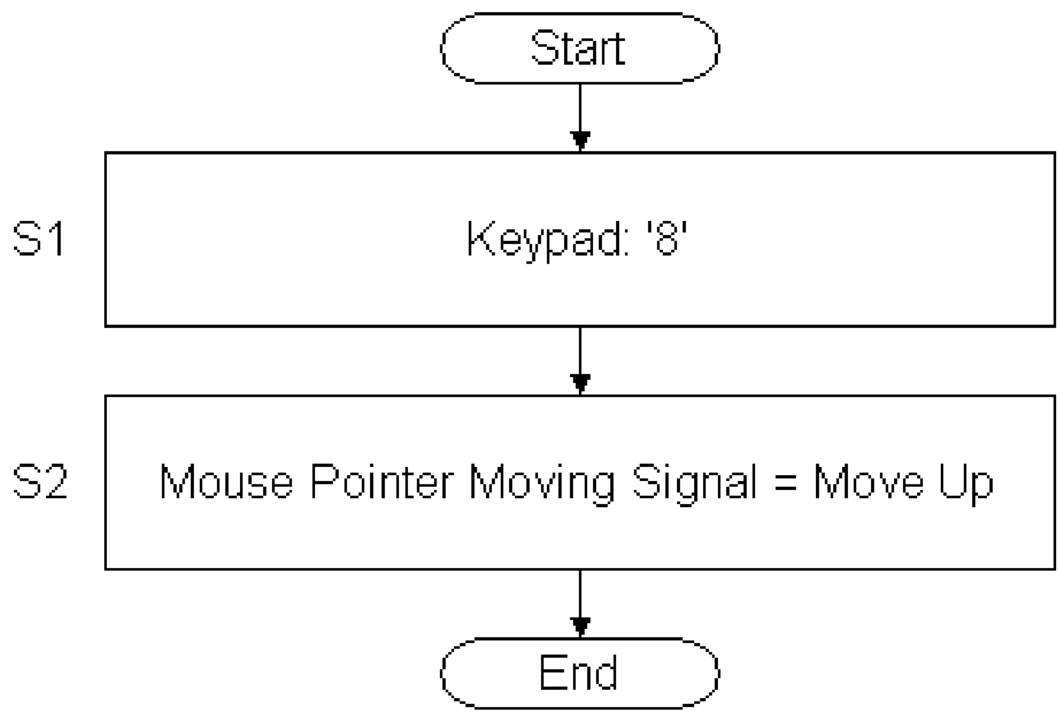

Fig. 1010
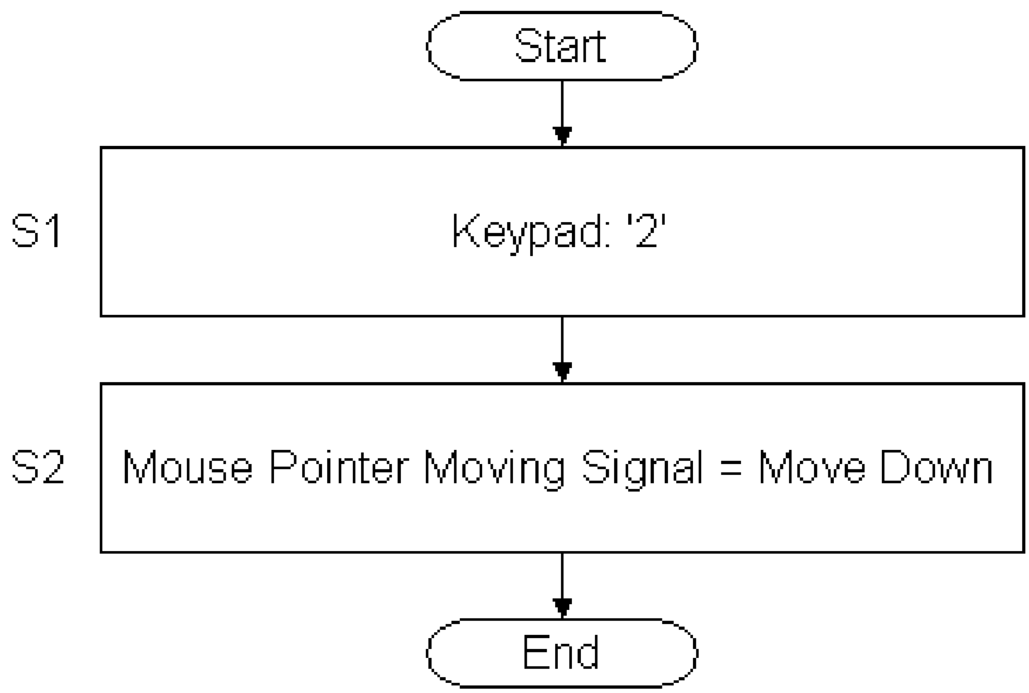

Fig. 1011
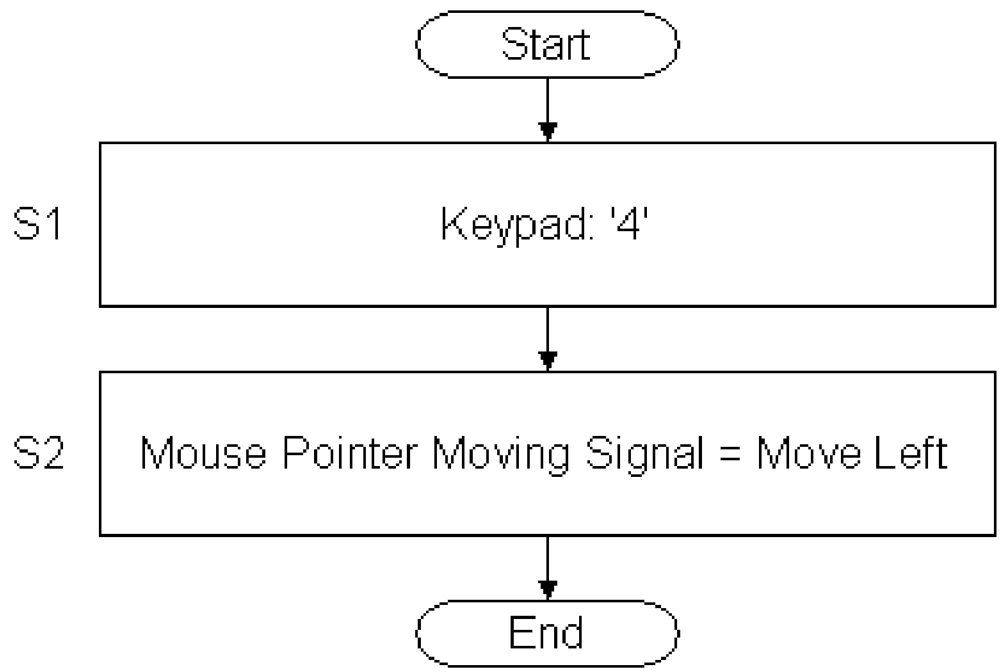

Fig. 1012
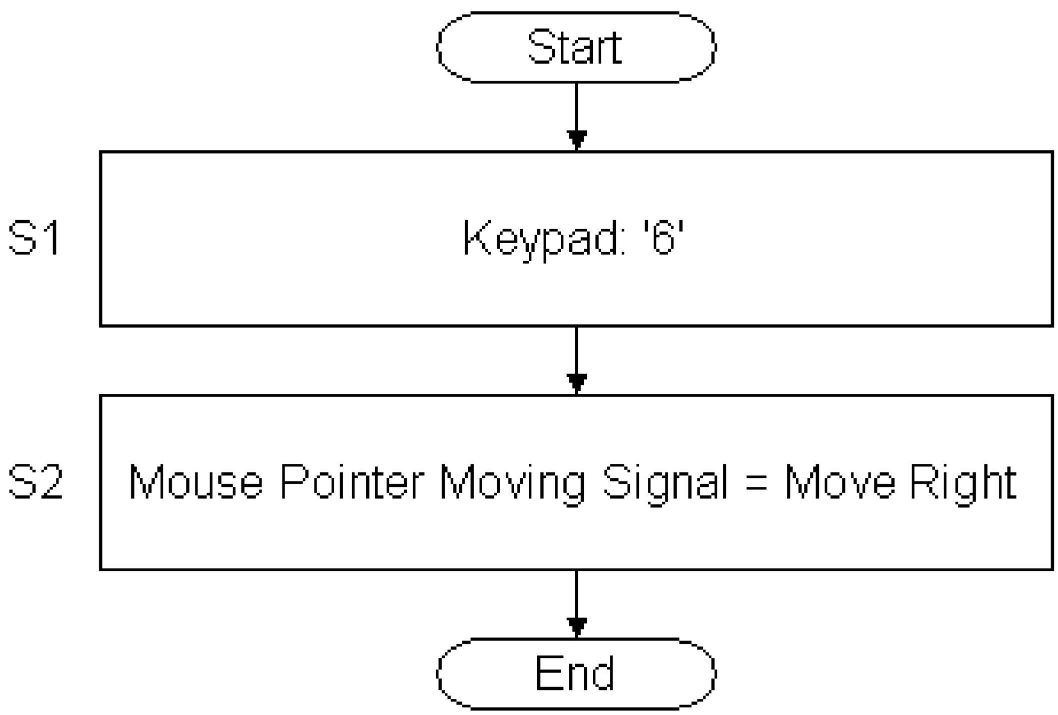

Fig. 1013
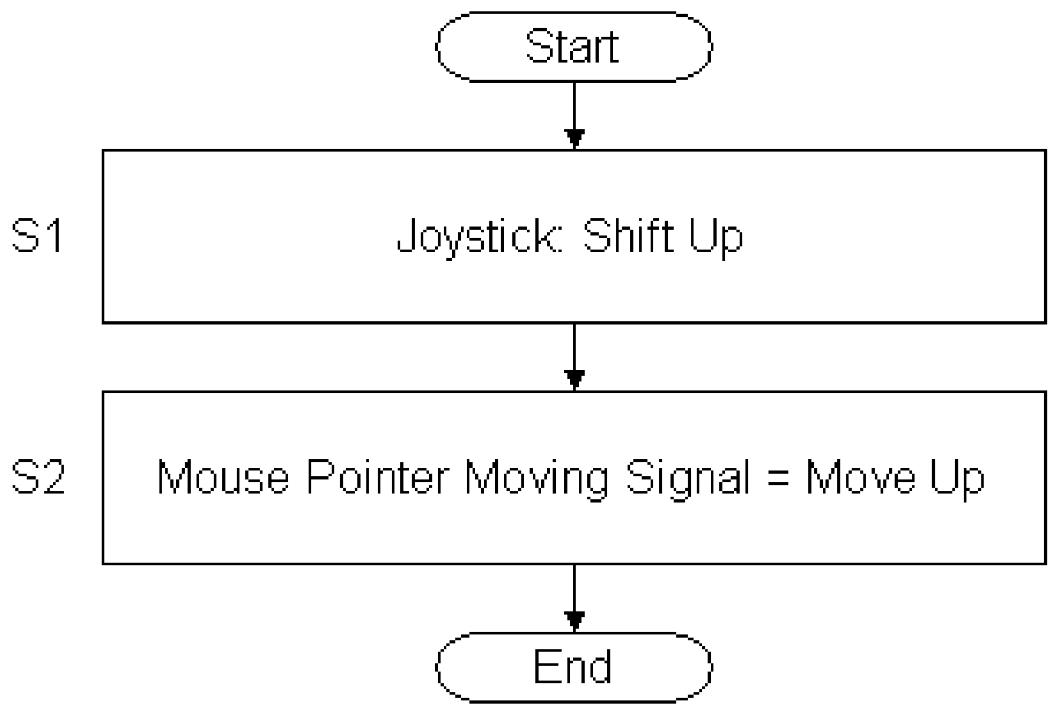

Fig. 1014
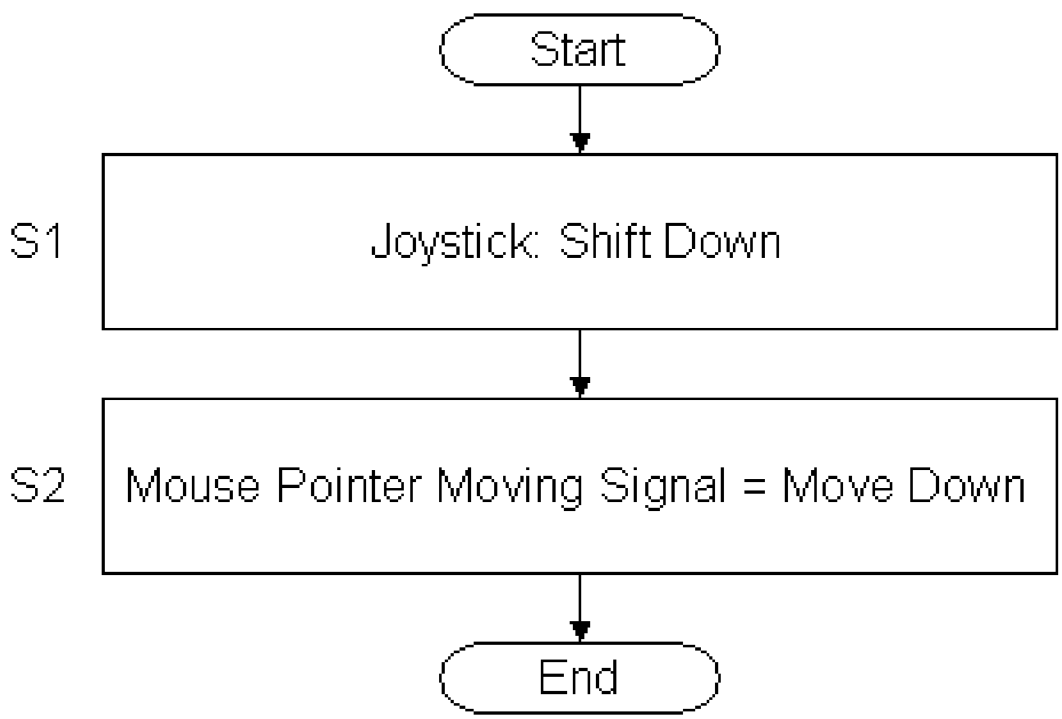

Fig. 1015
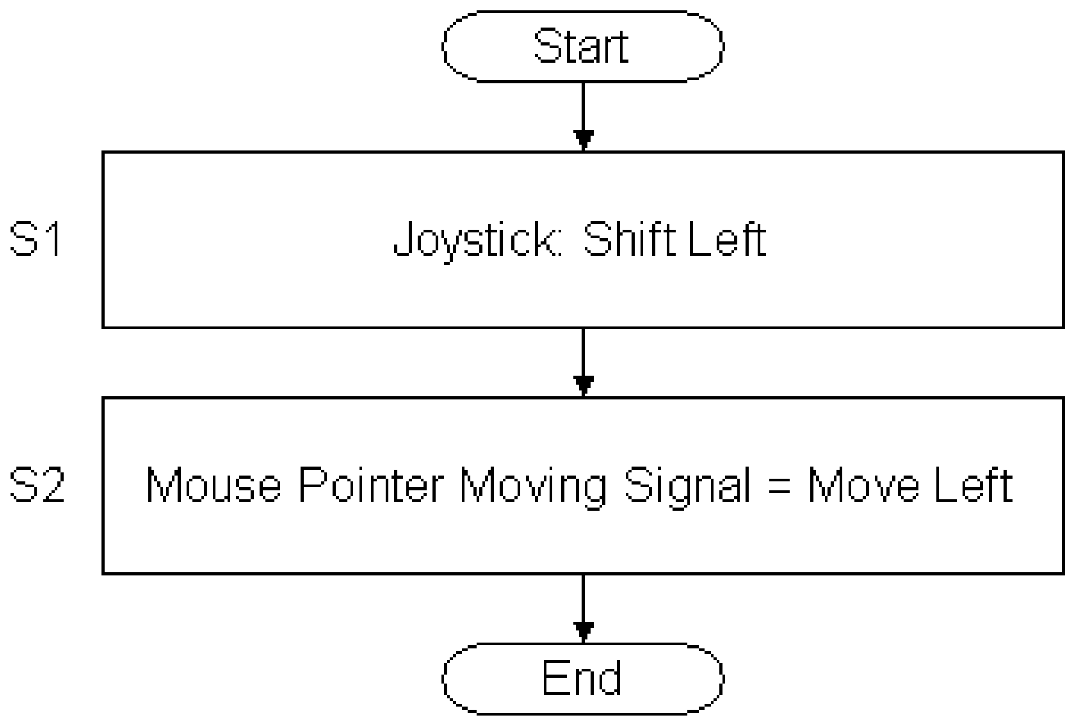

Fig. 1016
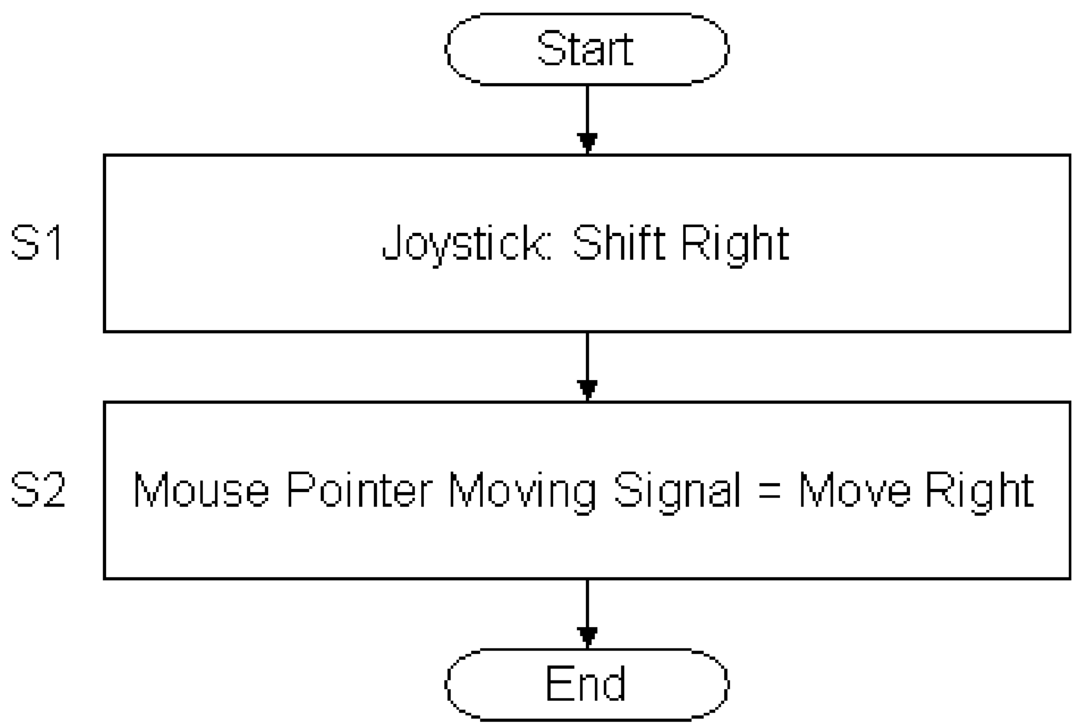

Fig. 1017
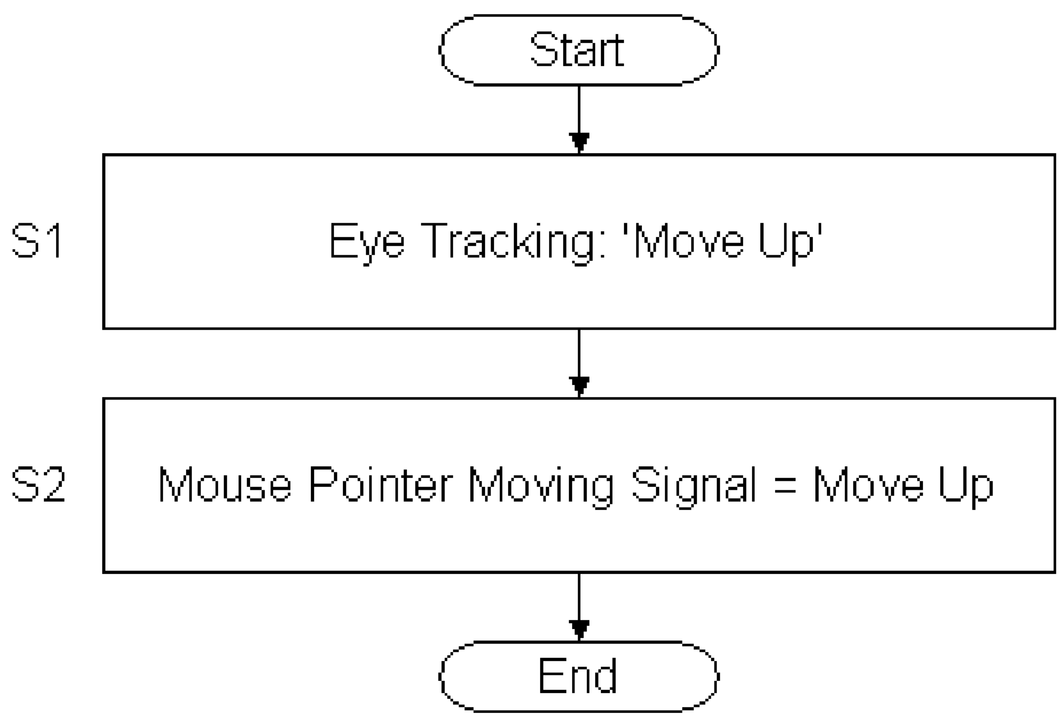

Fig. 1018
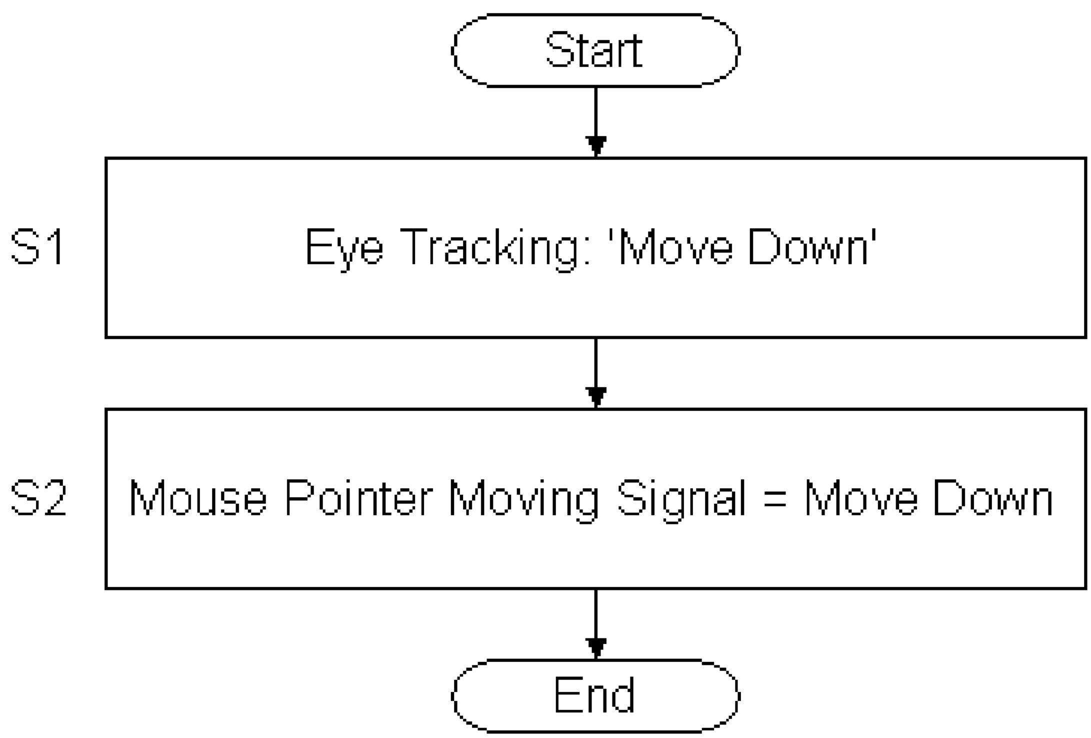

Fig. 1019
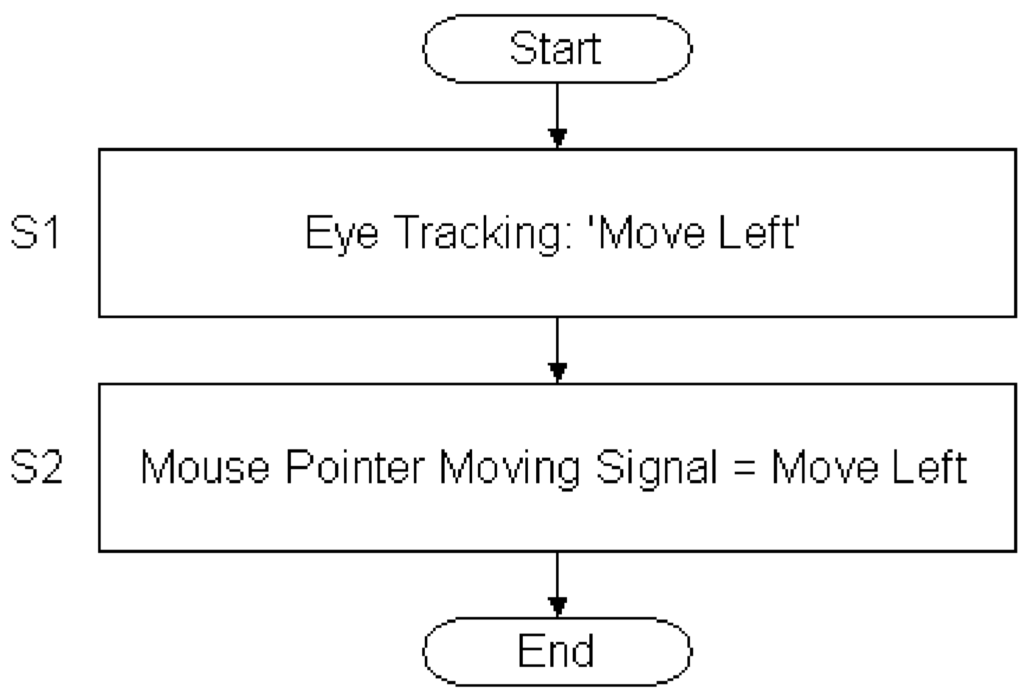

Fig. 1020
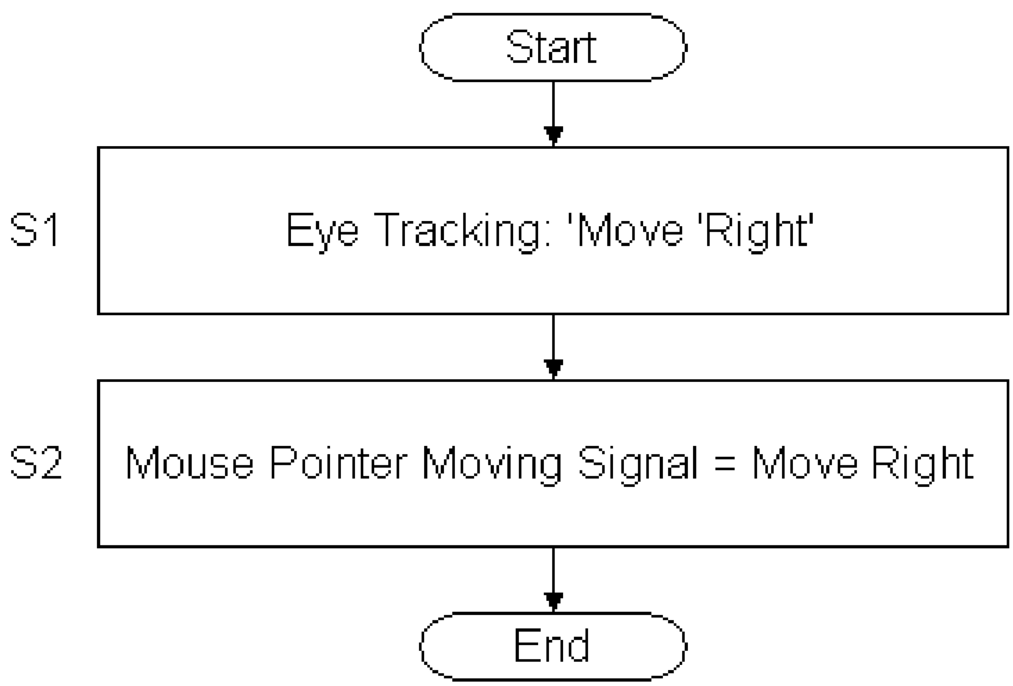

Fig. 1021
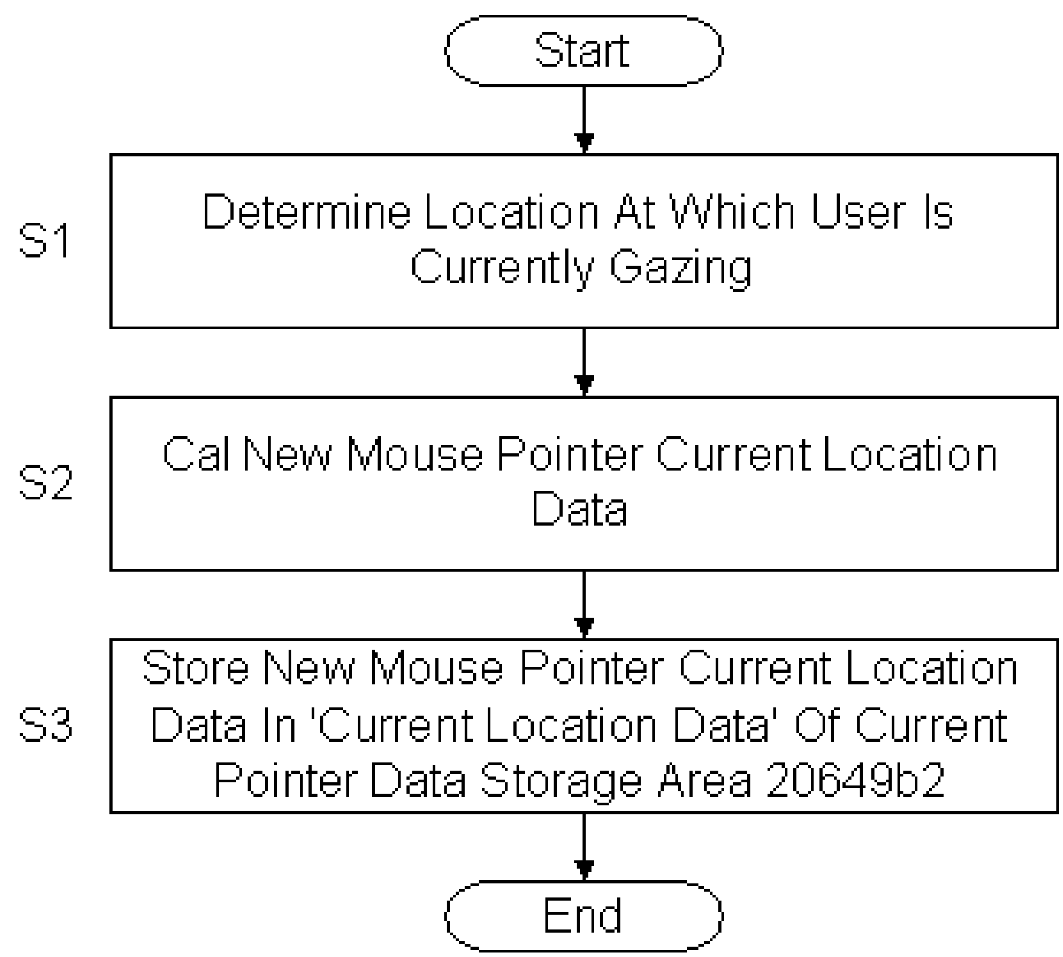

Fig. 1022
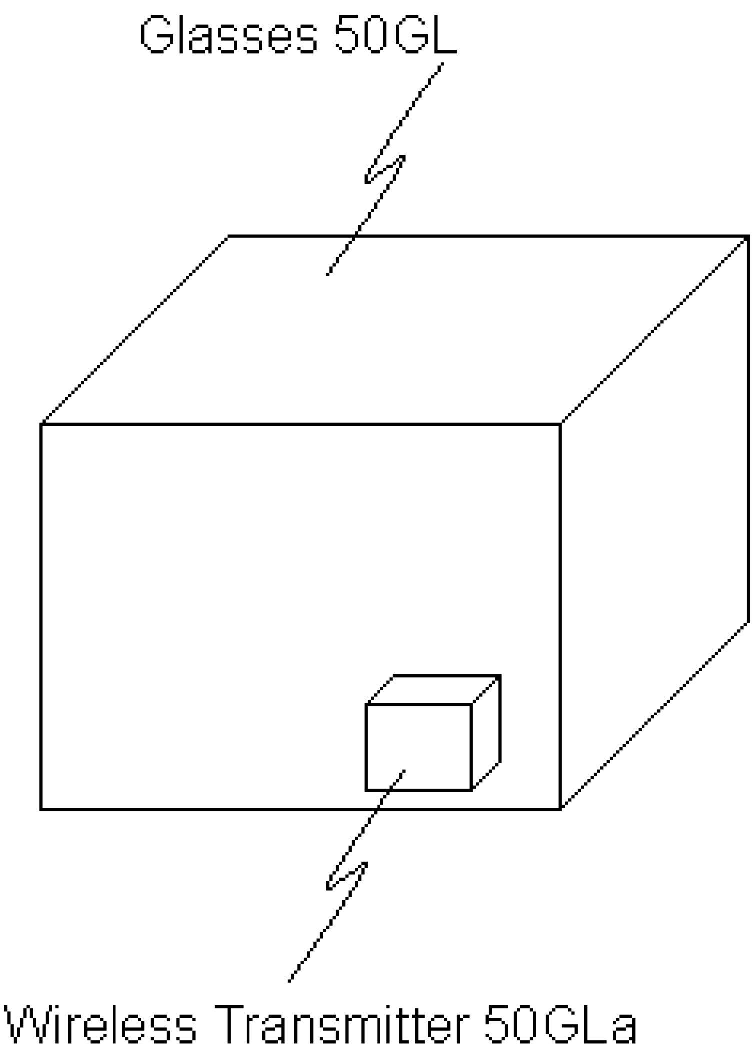

Fig. 1023
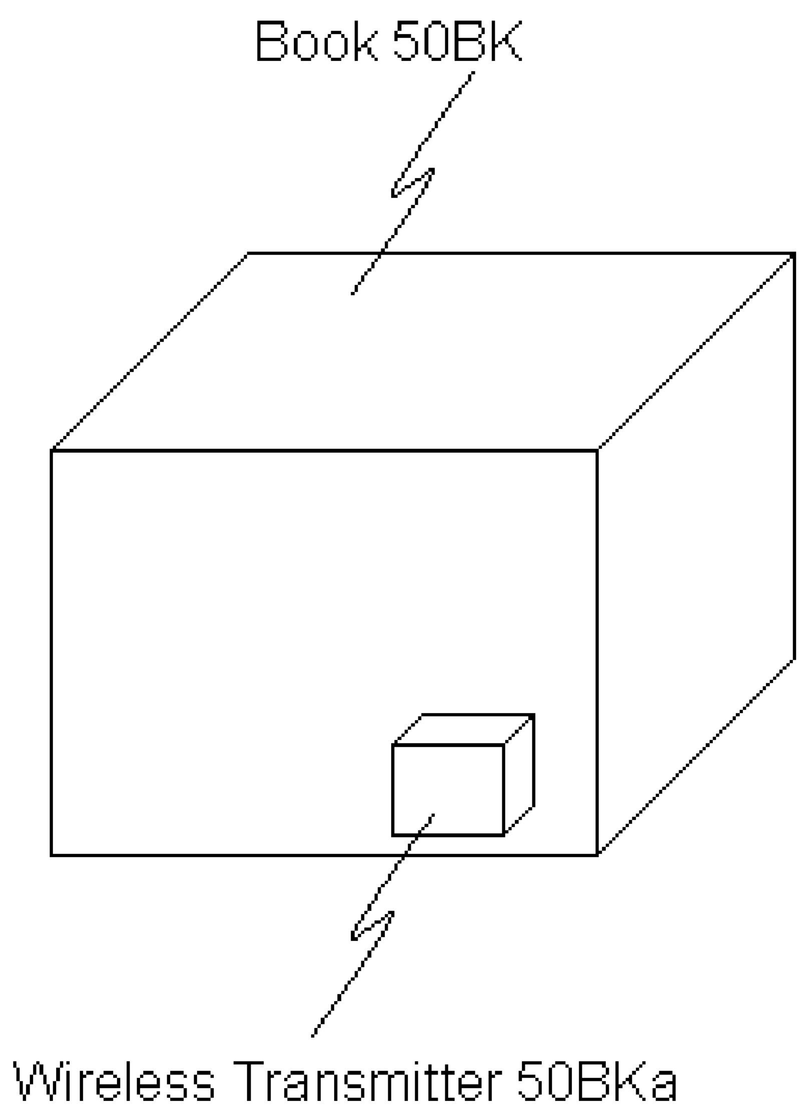

Fig. 1024
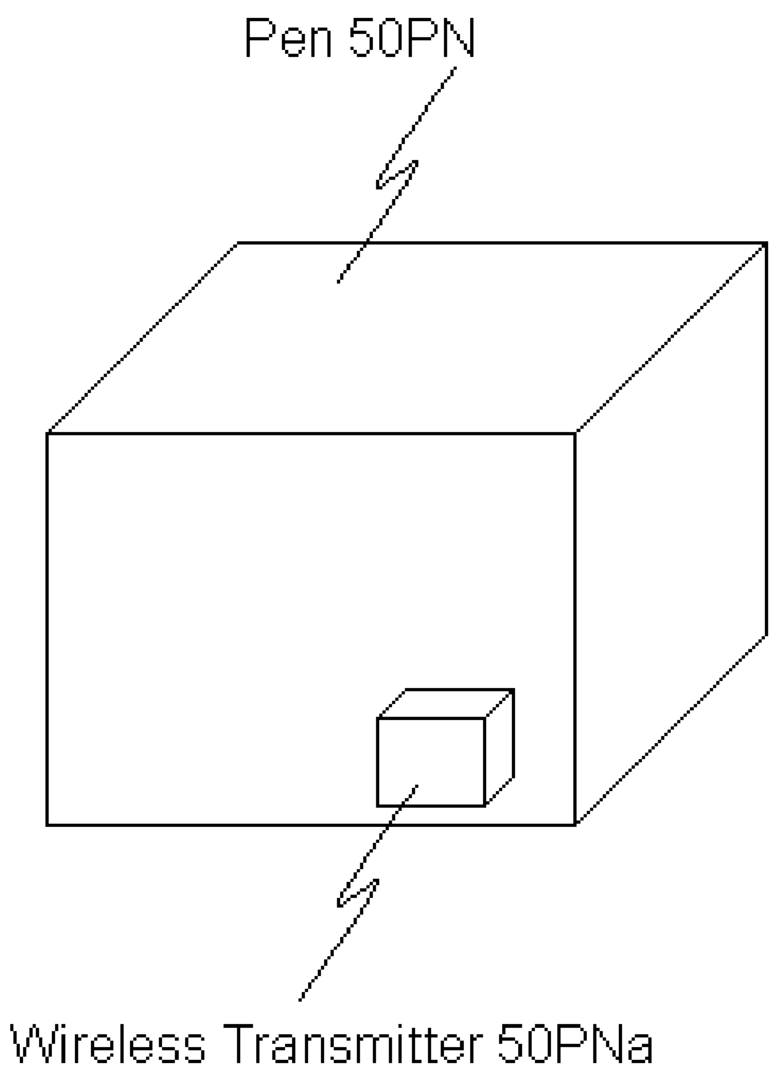

Fig. 1025
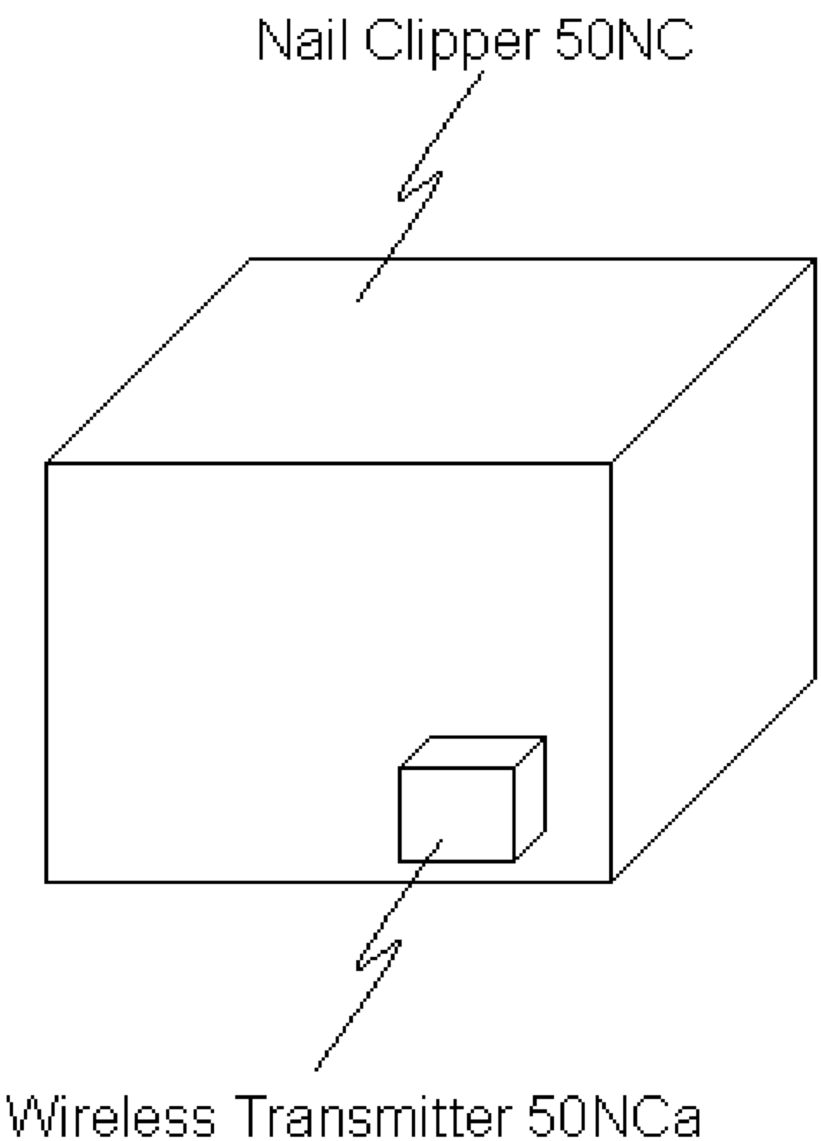

Fig. 1026
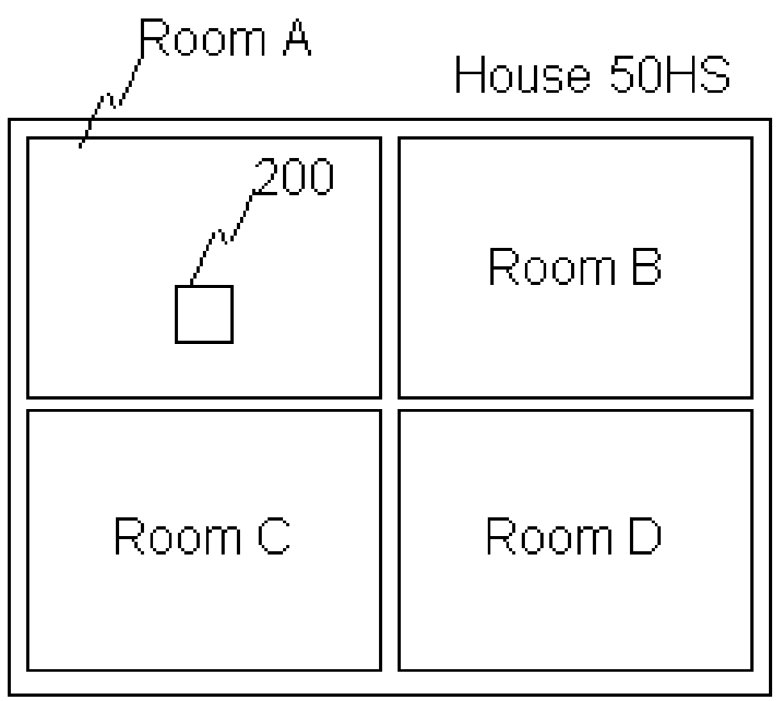

Fig. 1027
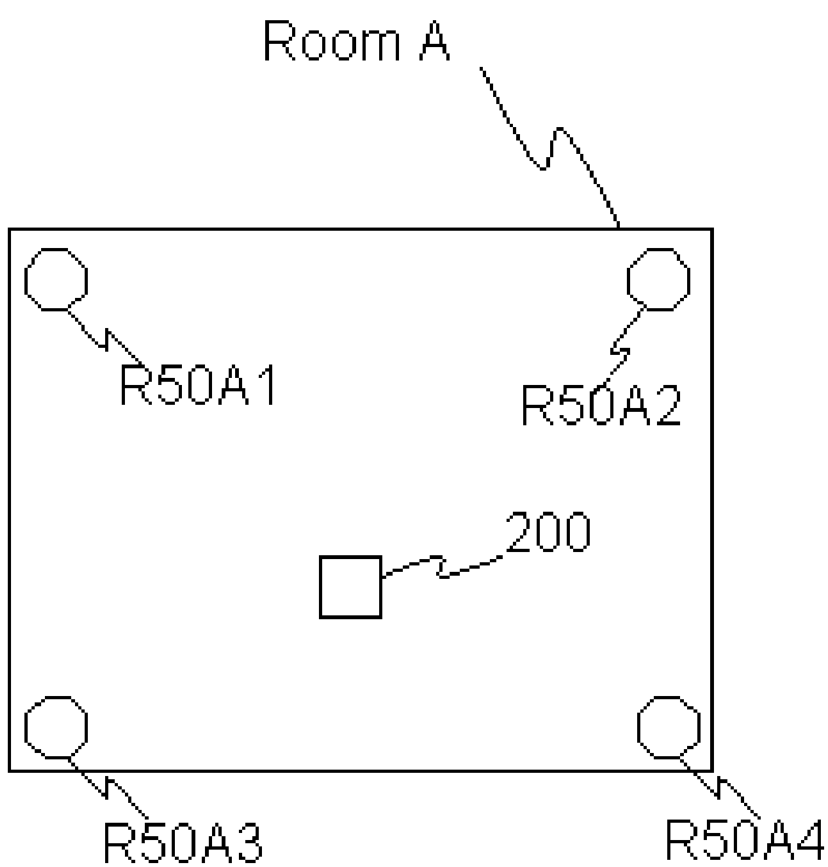

Fig. 1028
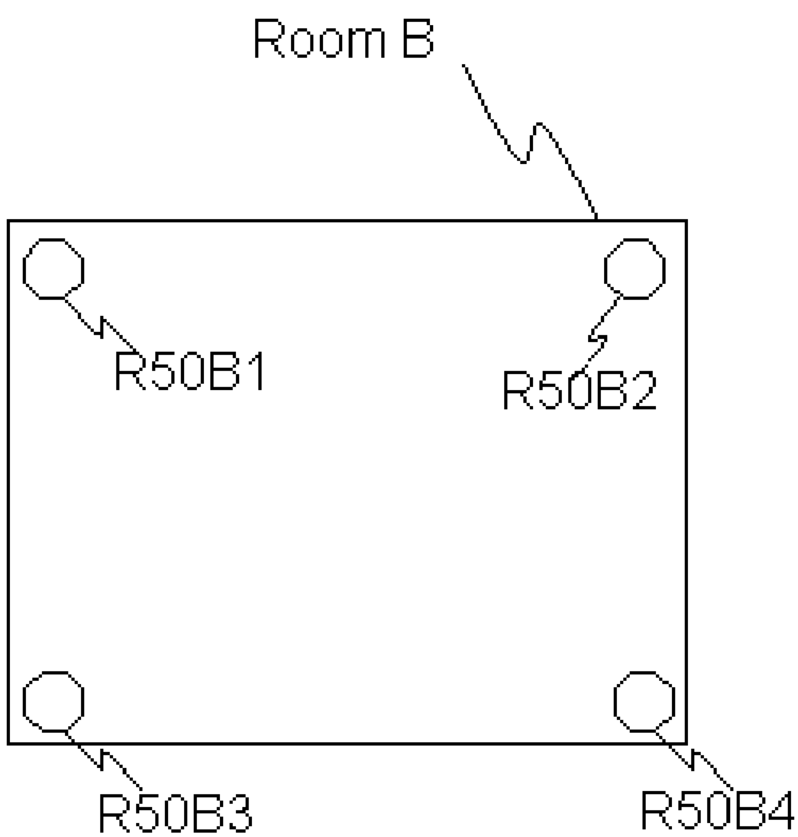

Fig. 1029
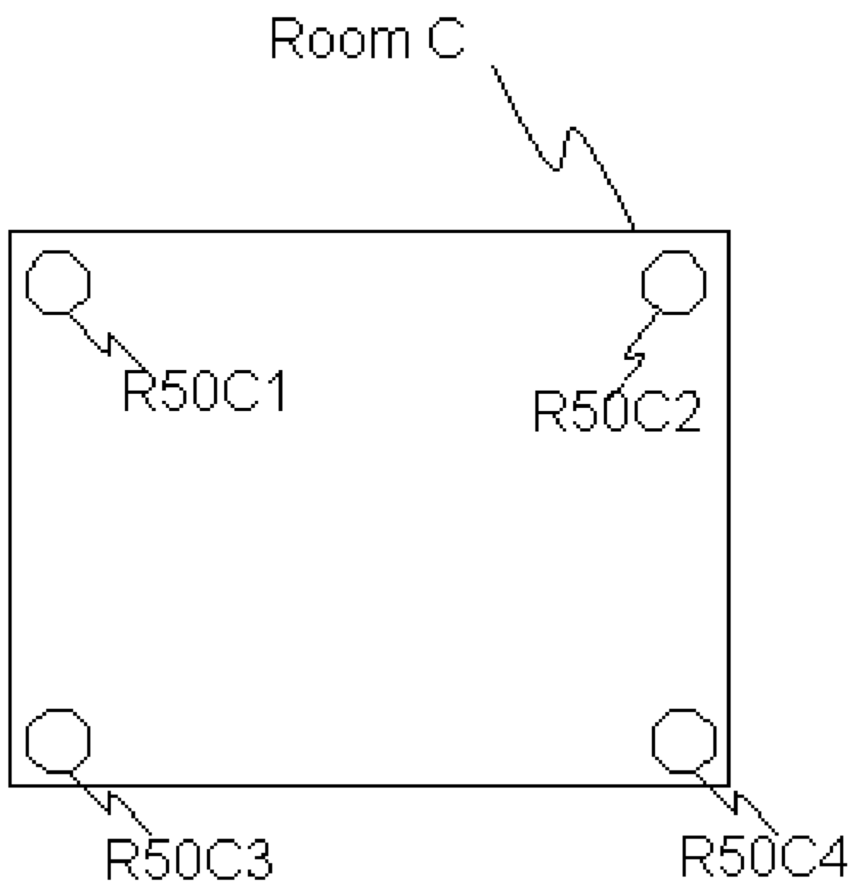

Fig. 1030
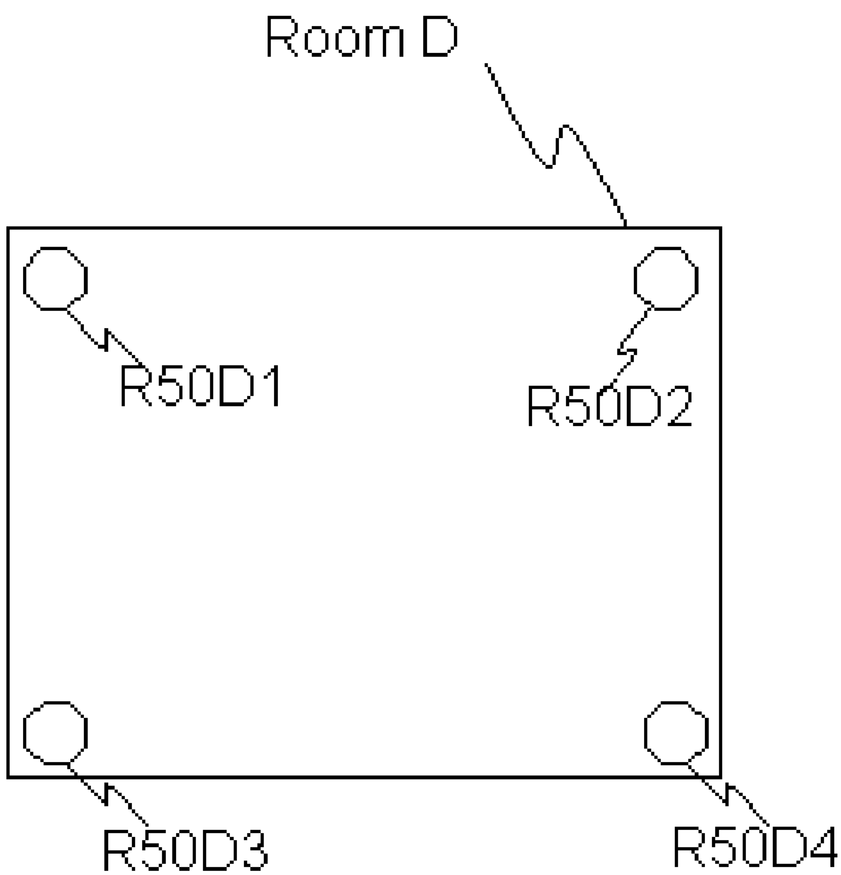

Fig. 1031
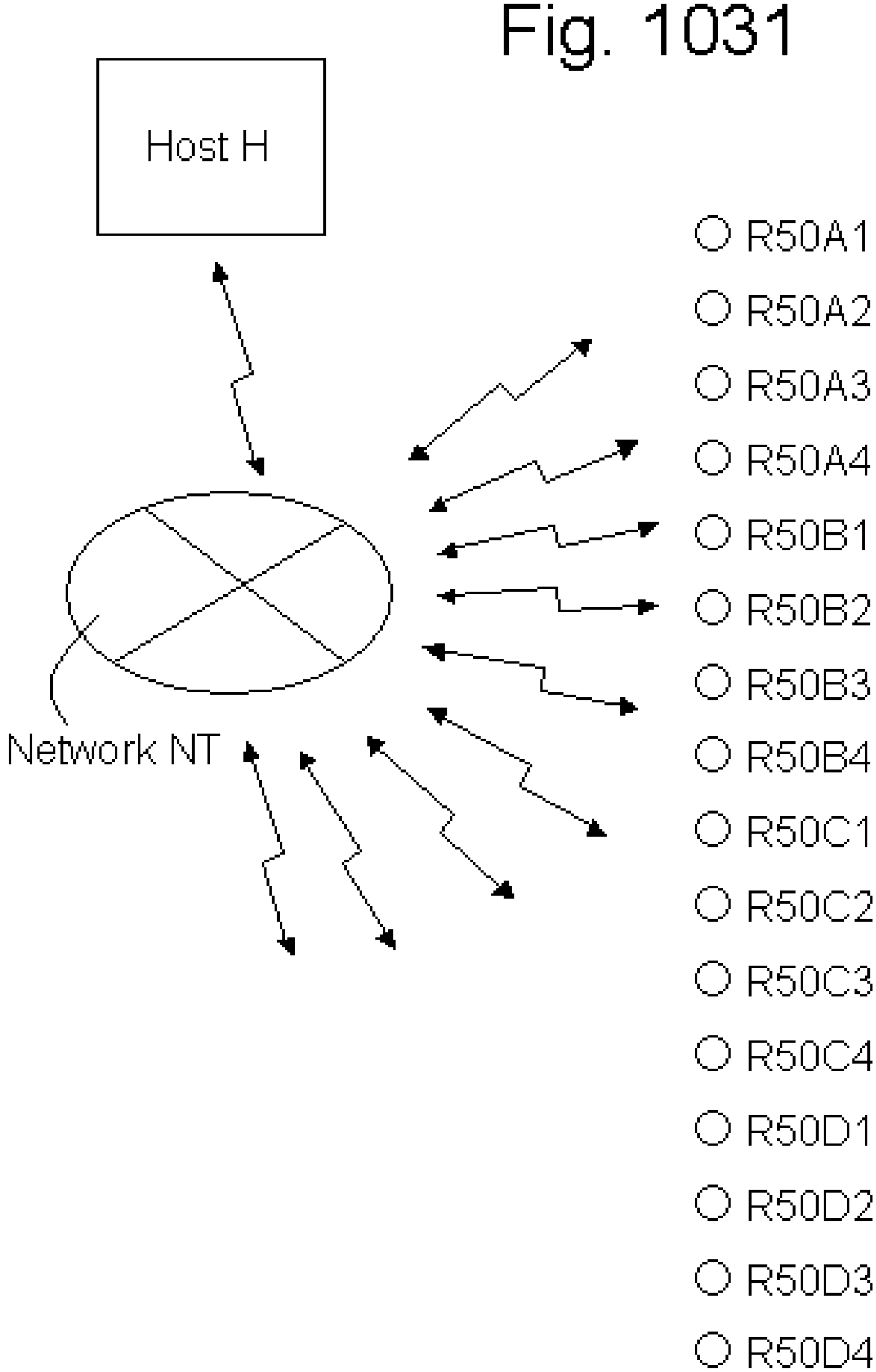

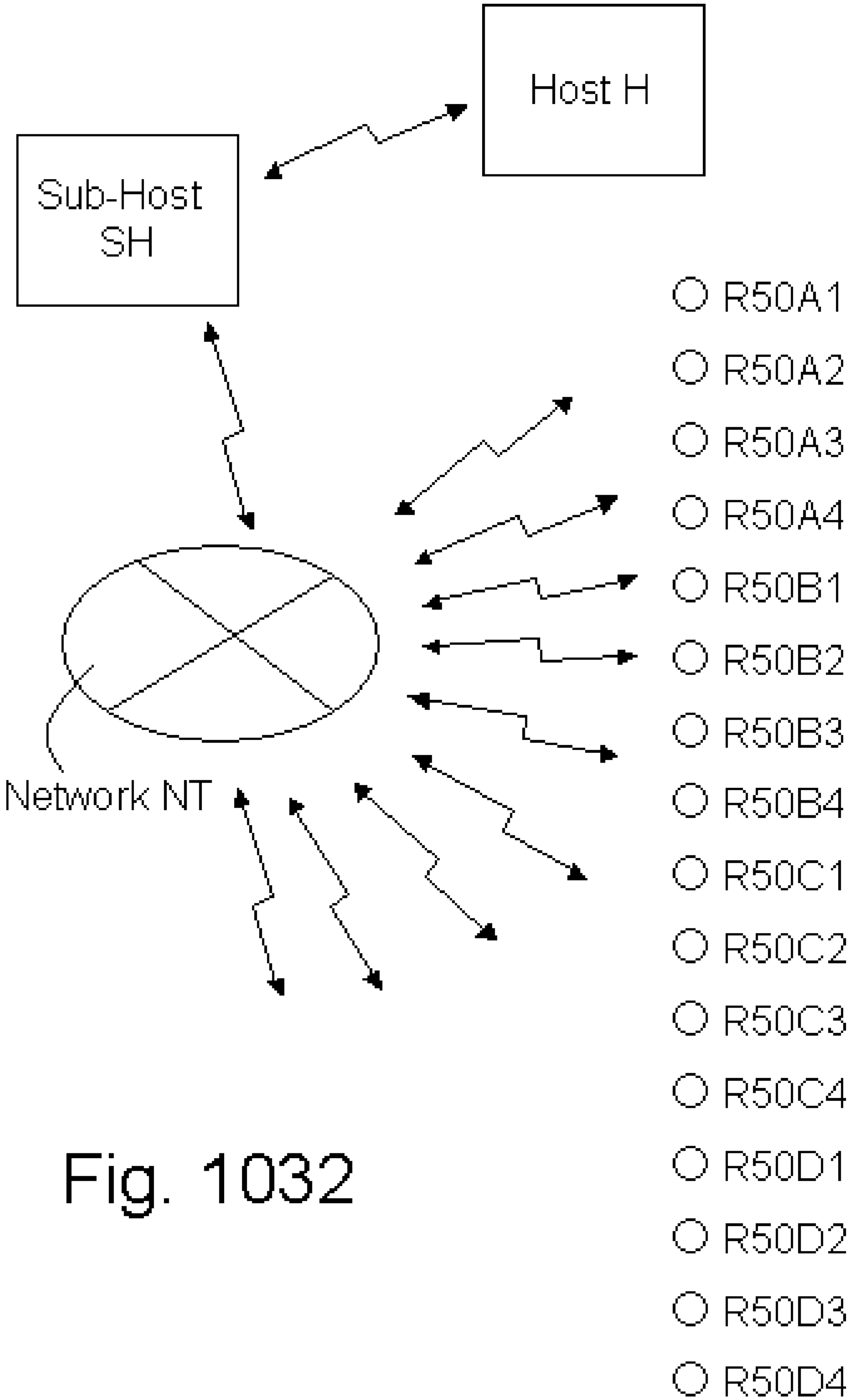
Fig. 1032

Fig. 1033
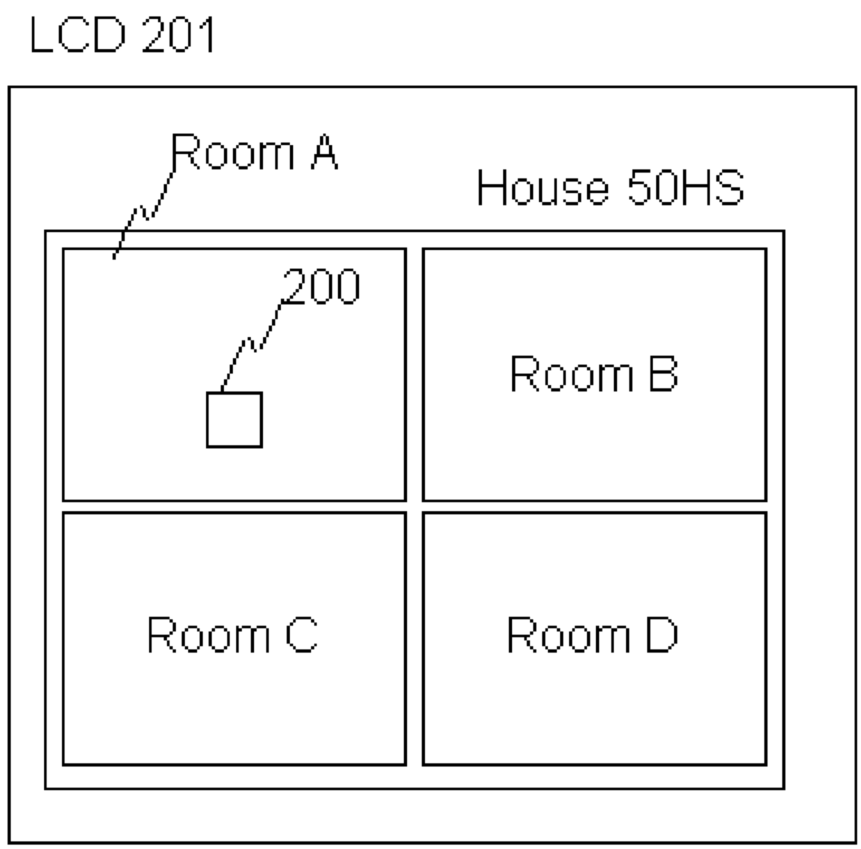

Fig. 1034
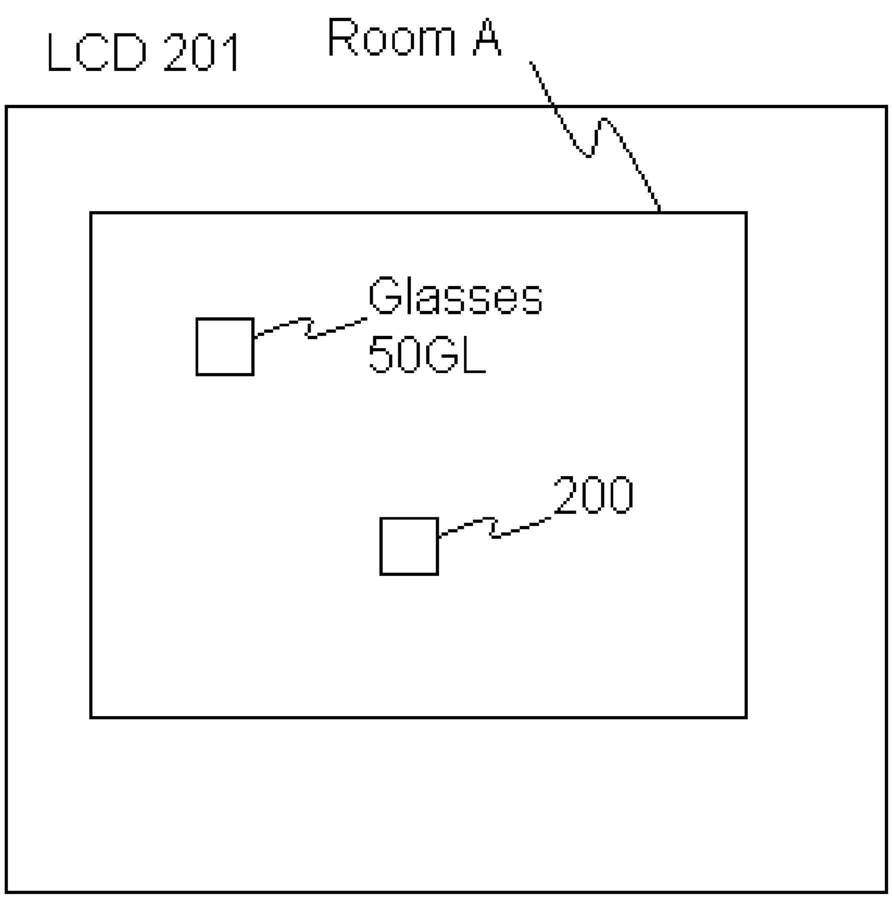

Fig. 1035
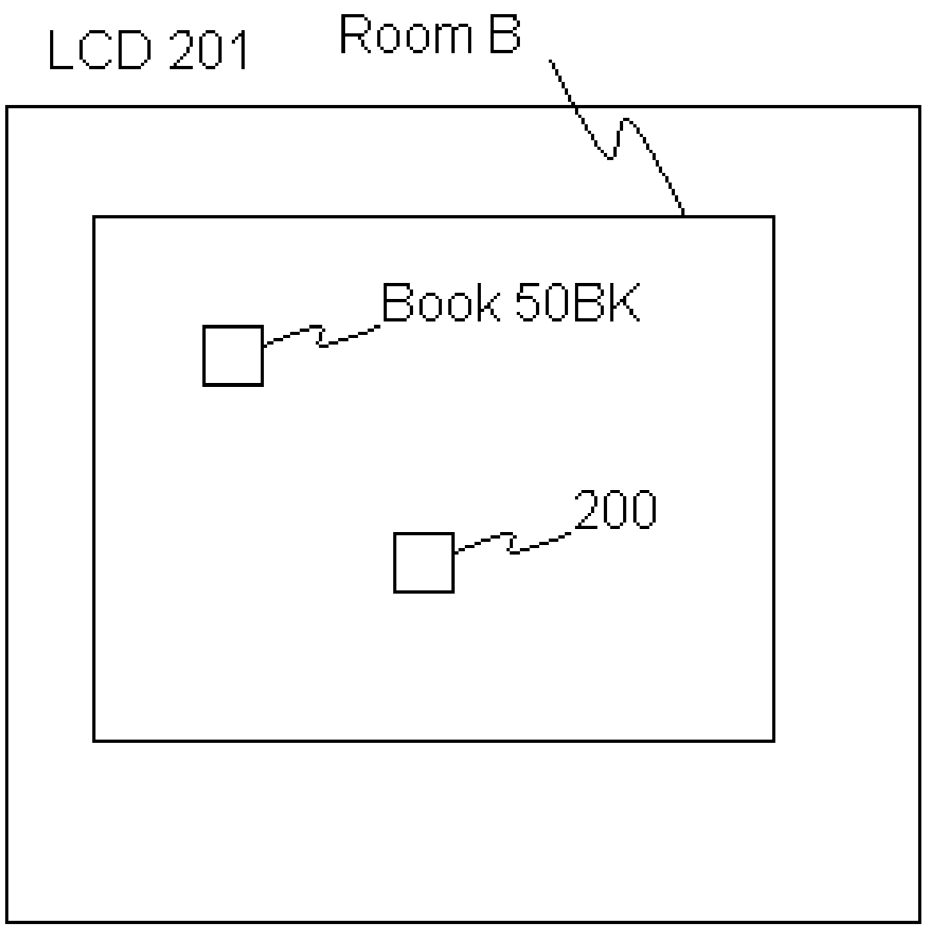

Fig. 1036
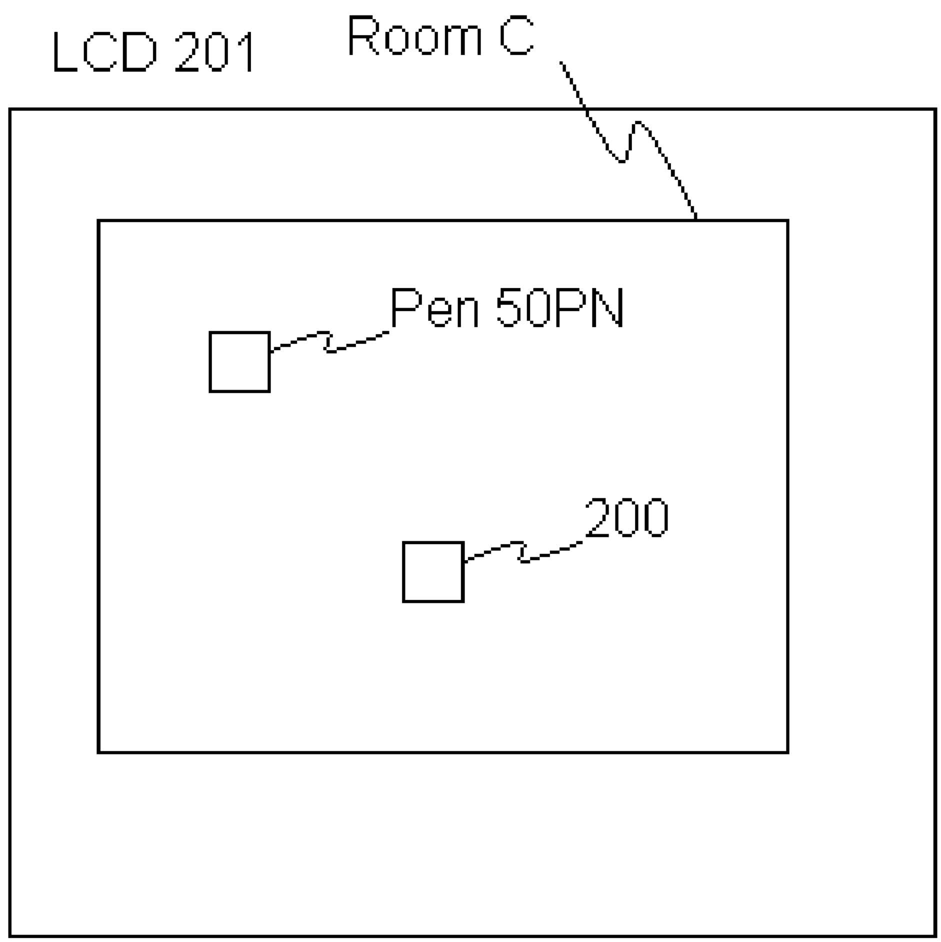

Fig. 1037
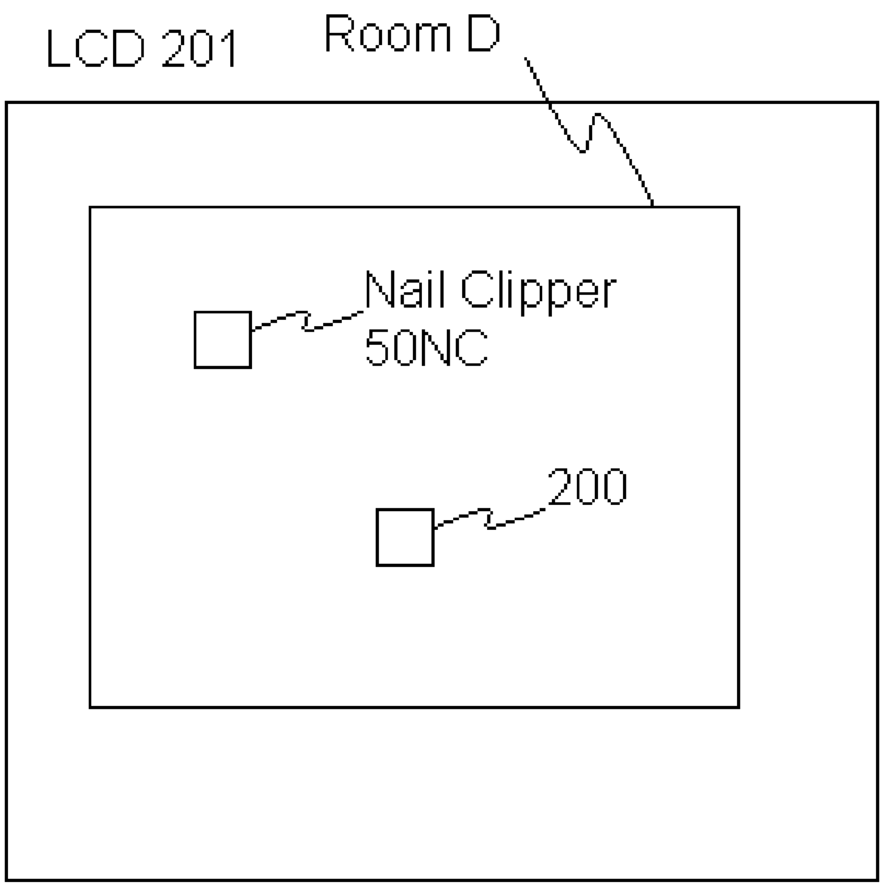

Fig. 1038
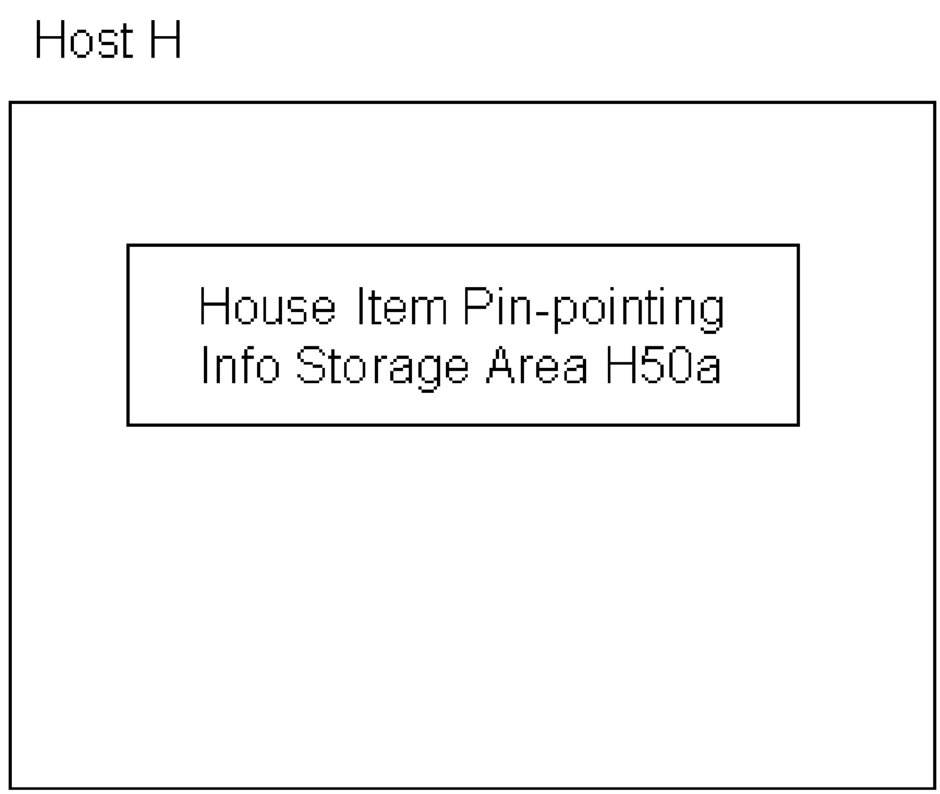

Fig. 1039
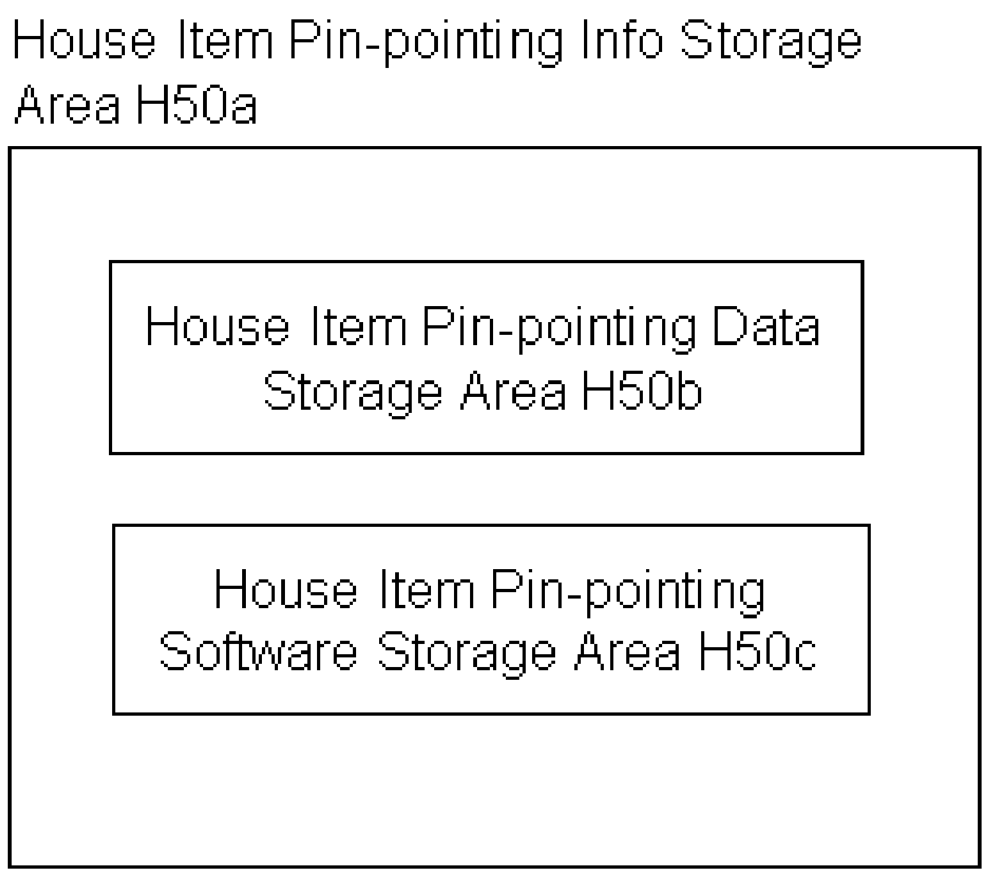

Fig. 1040
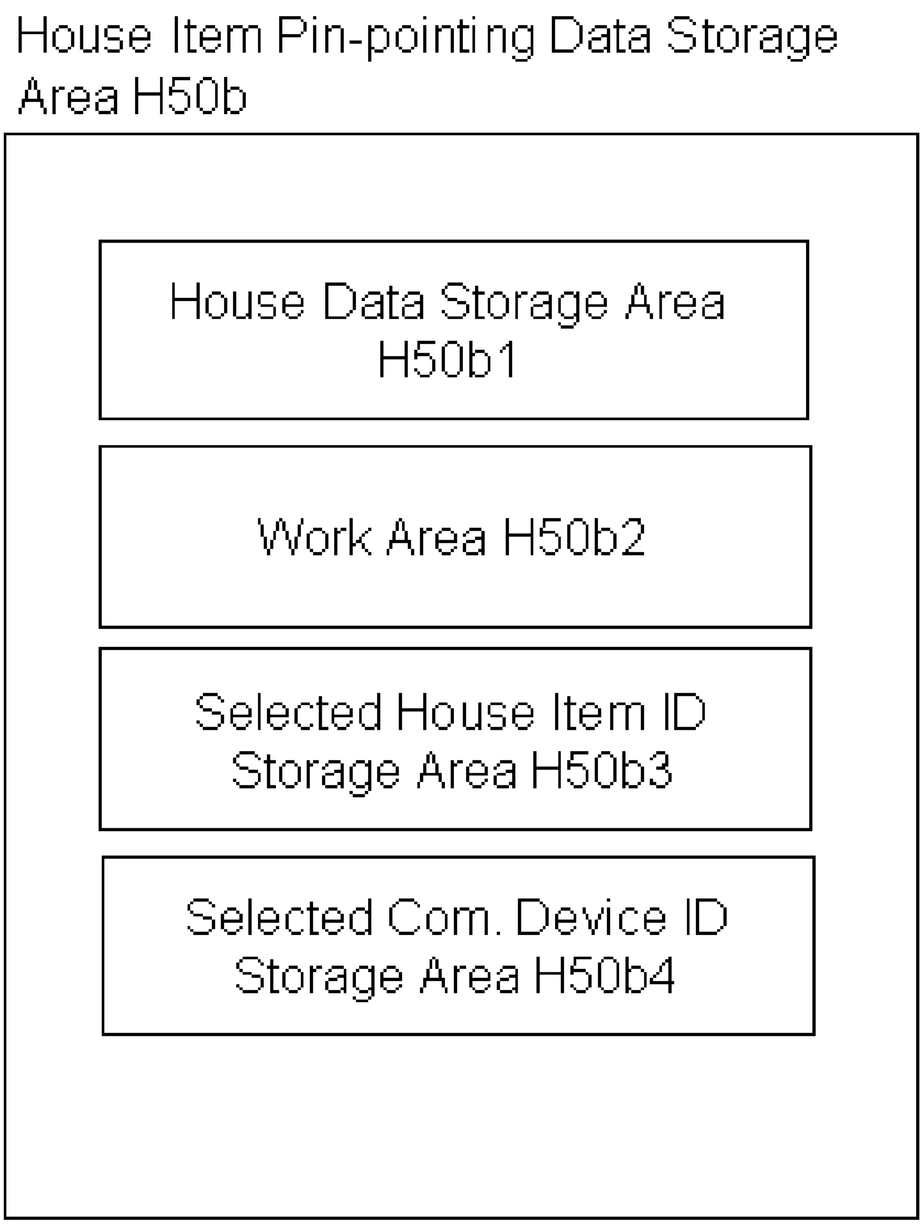

Fig. 1041
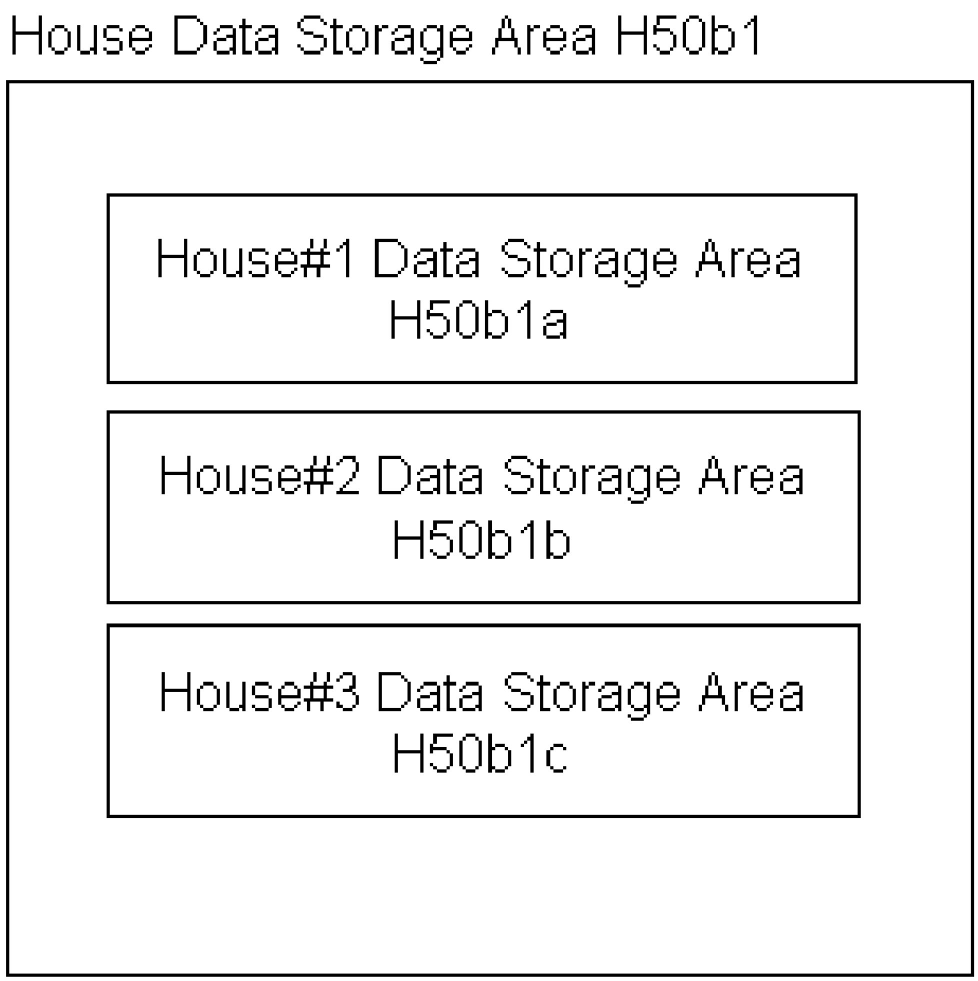

Fig. 1042
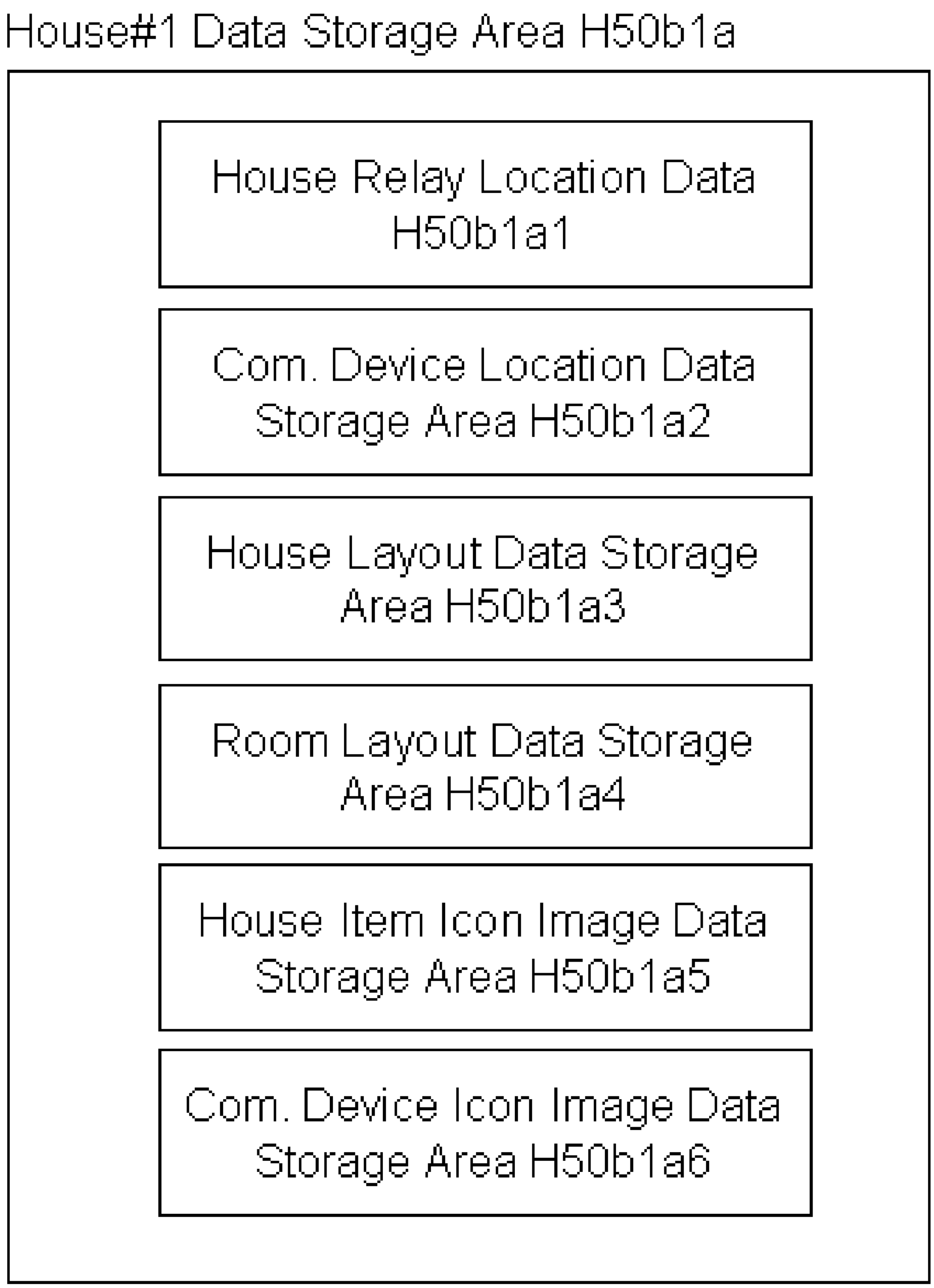

Fig. 1043
House Layout Data Storage Area
H50b1a3
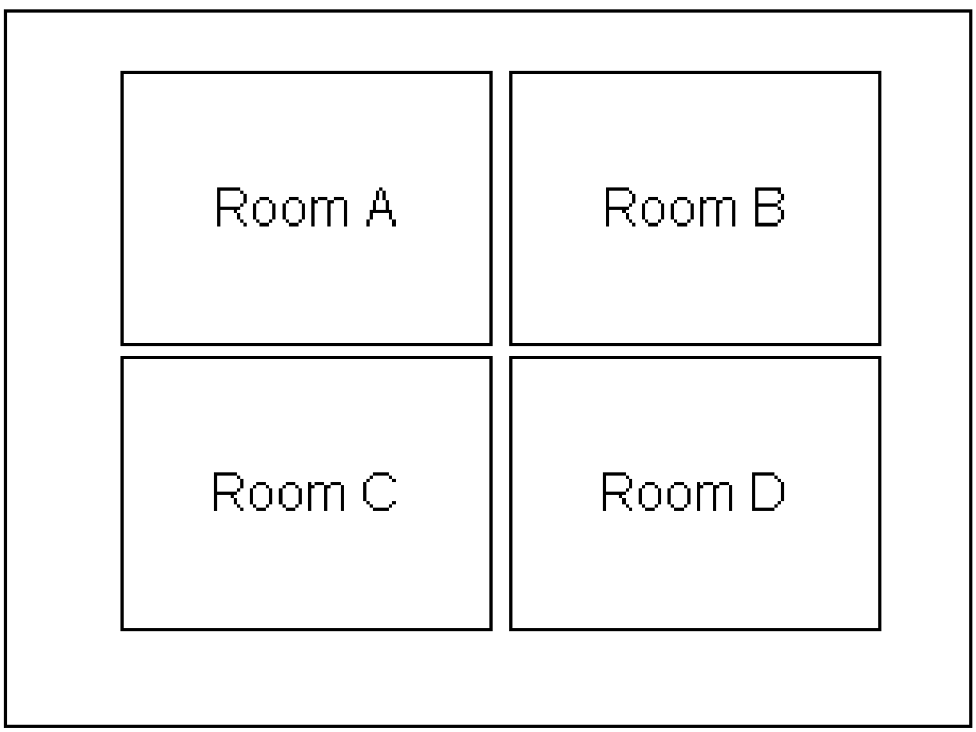

Fig. 1044

Room Layout Data Storage Area
H50b1a4

| Room ID | Room Layout Data |
|---|---|
| Room A | Room Layout Data 50RLD1 |
| Room B | Room Layout Data 50RLD2 |
| Room C | Room Layout Data 50RLD3 |
| Room D | Room Layout Data 50RLD4 |

Fig. 1045

House Relay Location Data H50b1a1

| House ID | Room ID | Relay ID | Relay Location Data |
|---|---|---|---|
| House #1 | Room A | R50A1 | (x, y, z) |
| | | R50A2 | (x, y, z) |
| | | R50A3 | (x, y, z) |
| | | R50A4 | (x, y, z) |
| | Room B | R50B1 | (x, y, z) |
| | | R50B2 | (x, y, z) |
| | | R50B3 | (x, y, z) |
| | | R50B4 | (x, y, z) |
| | Room C | R50C1 | (x, y, z) |
| | | R50C2 | (x, y, z) |
| | | R50C3 | (x, y, z) |
| | | R50C4 | (x, y, z) |
| | Room D | R50D1 | (x, y, z) |
| | | R50D2 | (x, y, z) |
| | | R50D3 | (x, y, z) |
| | | R50D4 | (x, y, z) |

Fig. 1046

House Item Icon Image Data Storage Area H50b1a5

| House Item ID | House Item Icon Image Data | House Item Name Data |
|---|---|---|
| House Item #1 | House Item Icon Image Data #1 | Glasses |
| House Item #2 | House Item Icon Image Data #2 | Book |
| House Item #3 | House Item Icon Image Data #3 | Pen |
| House Item #4 | House Item Icon Image Data #4 | Nail Clipper |

Fig. 1047

Com. Device Icon Image Data Storage Area H50b1a6

| Com. Device ID | Com. Device Icon Image Data | User Name Data |
|---|---|---|
| Com. Device #1 | Com. Device Icon Image Data #1 | User Name #1 |
| Com. Device #2 | Com. Device Icon Image Data #2 | User Name #2 |
| Com. Device #3 | Com. Device Icon Image Data #3 | User Name #3 |

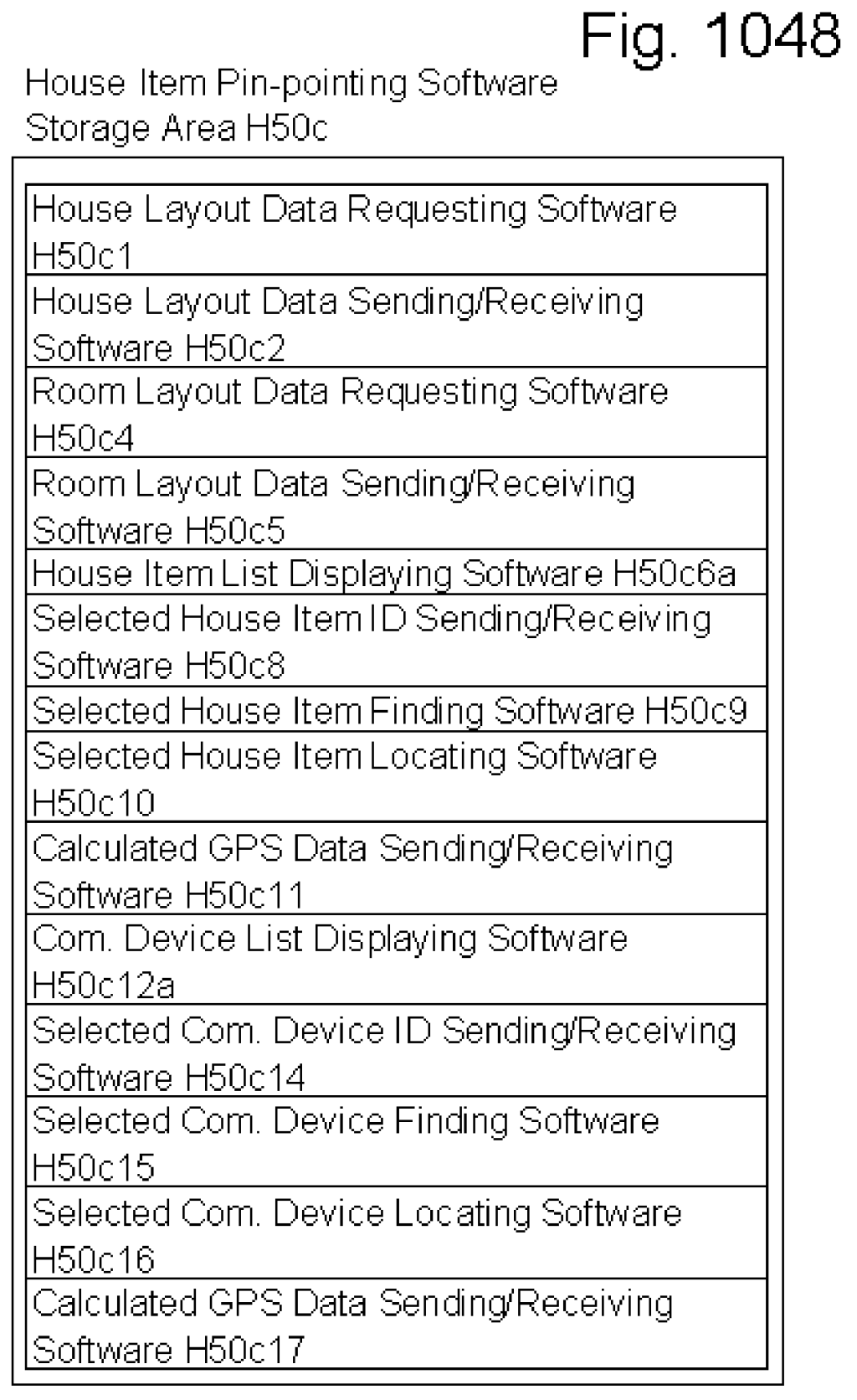

Fig. 1048

House Item Pin-pointing Software Storage Area H50c

| |
|---|
| House Layout Data Requesting Software H50c1 |
| House Layout Data Sending/Receiving Software H50c2 |
| Room Layout Data Requesting Software H50c4 |
| Room Layout Data Sending/Receiving Software H50c5 |
| House Item List Displaying Software H50c6a |
| Selected House Item ID Sending/Receiving Software H50c8 |
| Selected House Item Finding Software H50c9 |
| Selected House Item Locating Software H50c10 |
| Calculated GPS Data Sending/Receiving Software H50c11 |
| Com. Device List Displaying Software H50c12a |
| Selected Com. Device ID Sending/Receiving Software H50c14 |
| Selected Com. Device Finding Software H50c15 |
| Selected Com. Device Locating Software H50c16 |
| Calculated GPS Data Sending/Receiving Software H50c17 |

Fig. 1049
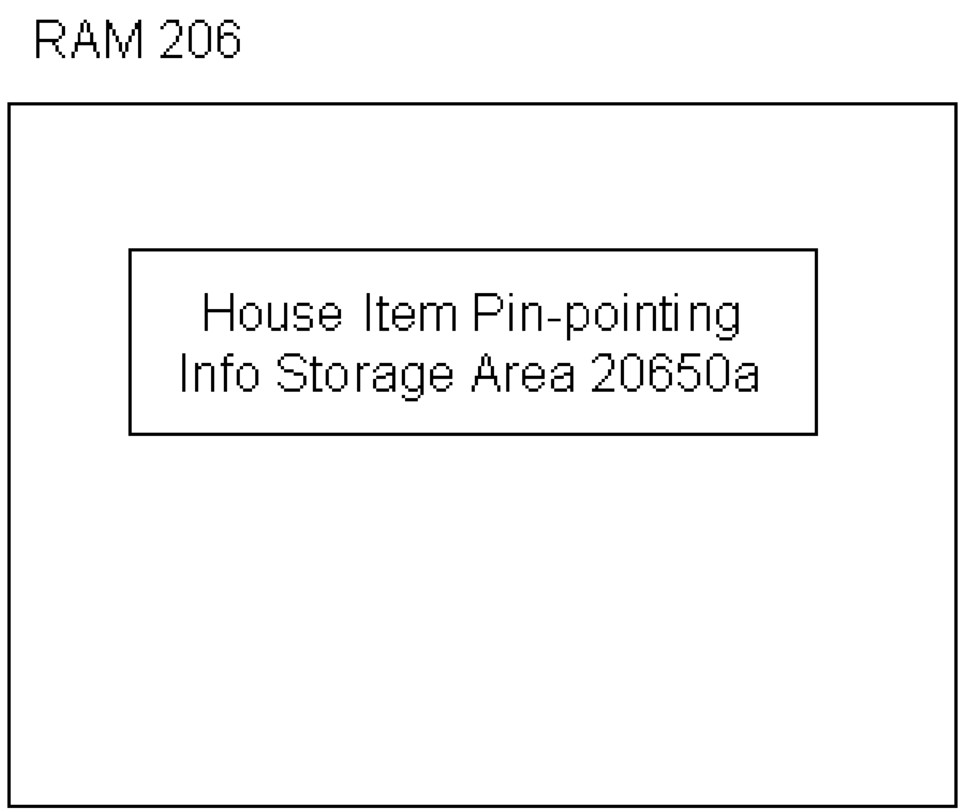

Fig. 1050
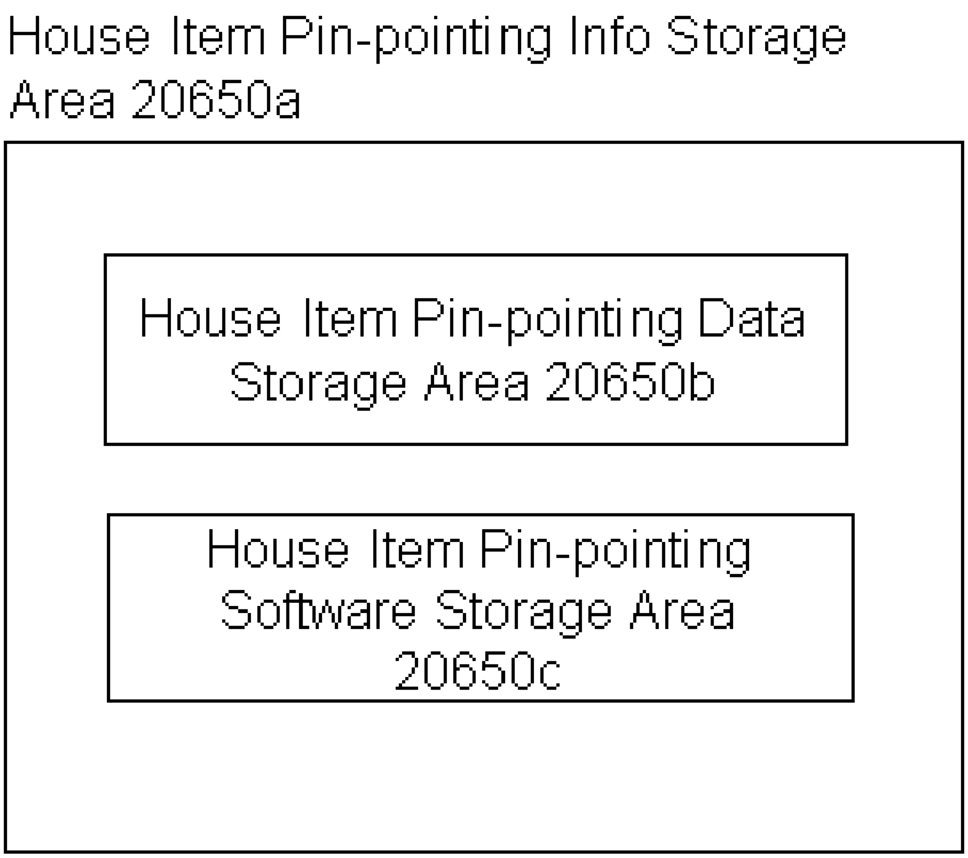

Fig. 1051
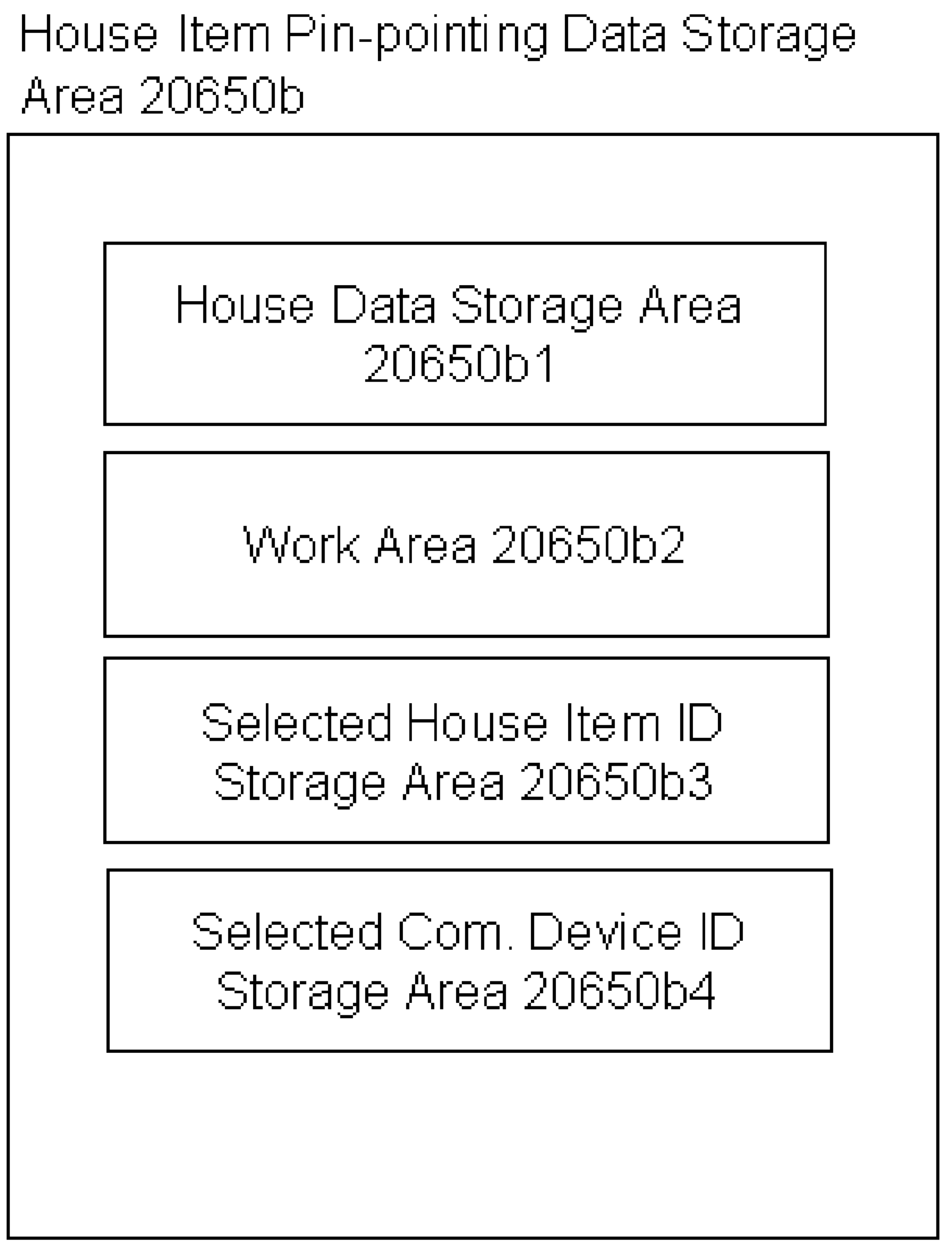

Fig. 1052
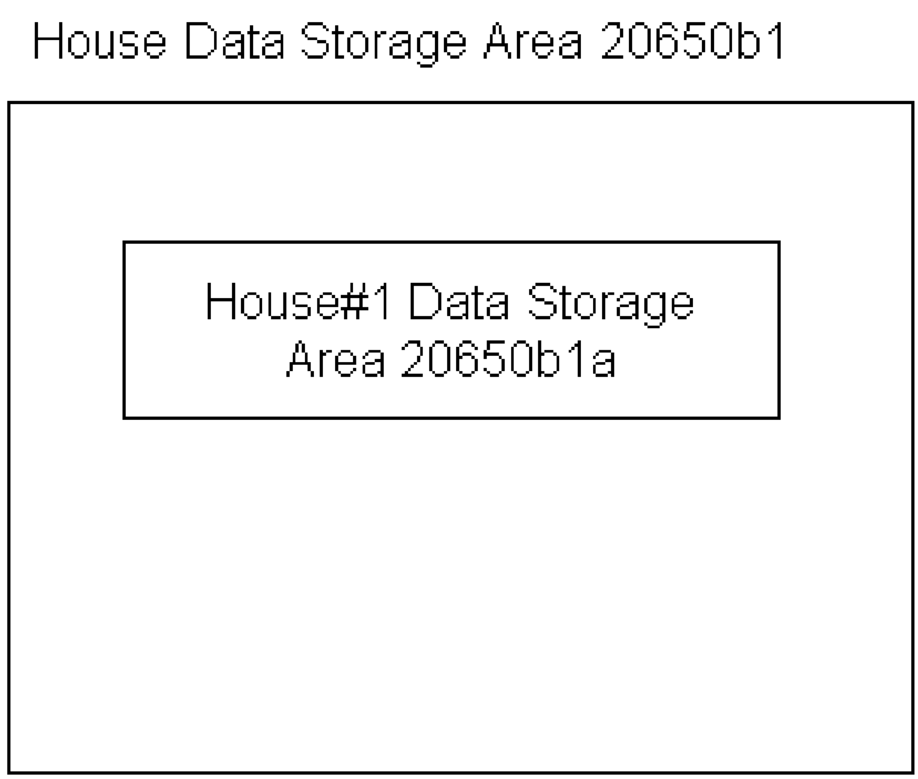

Fig. 1053
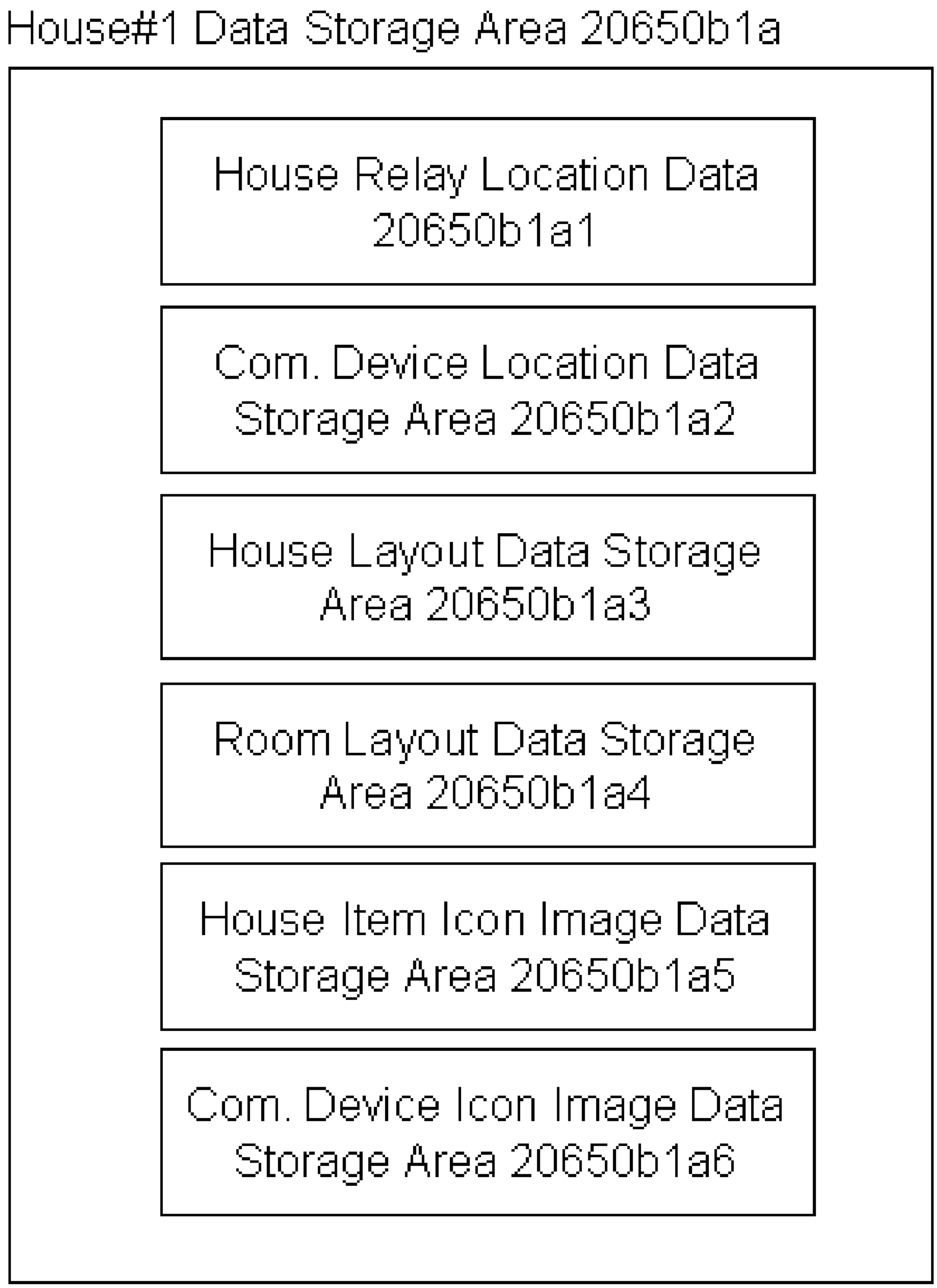

Fig. 1054
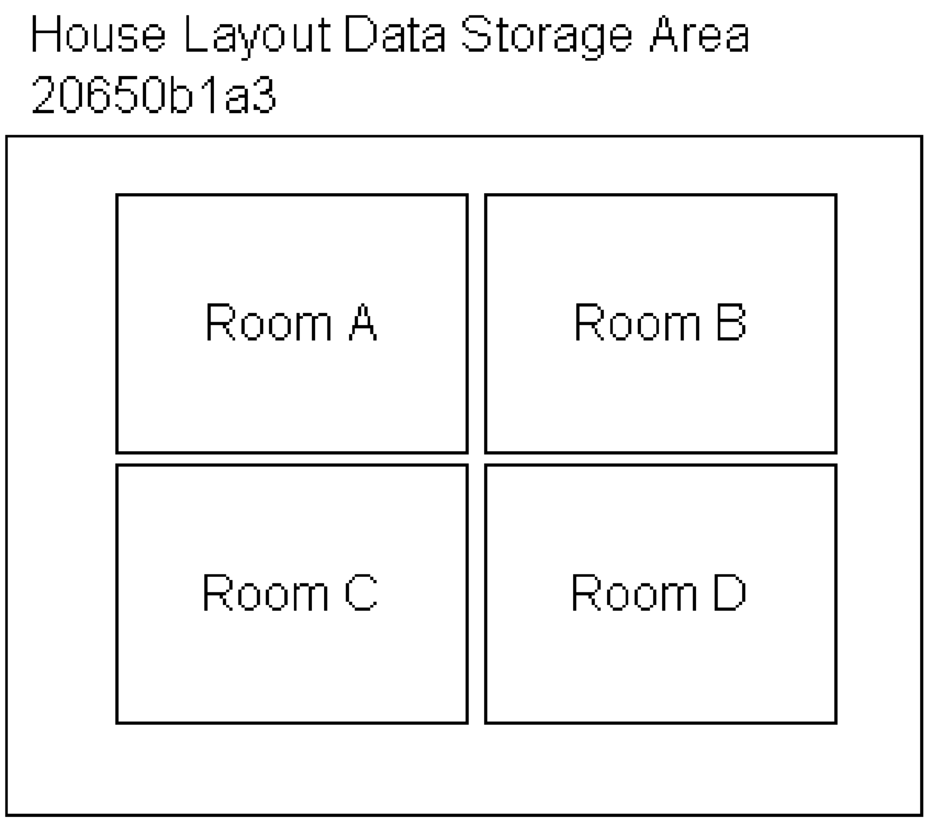

Fig. 1055

Room Layout Data Storage Area
20650b1a4

| Room ID | Room Layout Data |
|---|---|
| Room A | Room Layout Data 50RLD1 |
| Room B | Room Layout Data 50RLD2 |
| Room C | Room Layout Data 50RLD3 |
| Room D | Room Layout Data 50RLD4 |

Fig. 1056

House Relay Location Data 20650b1a1

| House ID | Room ID | Relay ID | Relay Location Data |
|---|---|---|---|
| House #1 | Room A | R50A1 | (x, y, z) |
| | | R50A2 | (x, y, z) |
| | | R50A3 | (x, y, z) |
| | | R50A4 | (x, y, z) |
| | Room B | R50B1 | (x, y, z) |
| | | R50B2 | (x, y, z) |
| | | R50B3 | (x, y, z) |
| | | R50B4 | (x, y, z) |
| | Room C | R50C1 | (x, y, z) |
| | | R50C2 | (x, y, z) |
| | | R50C3 | (x, y, z) |
| | | R50C4 | (x, y, z) |
| | Room D | R50D1 | (x, y, z) |
| | | R50D2 | (x, y, z) |
| | | R50D3 | (x, y, z) |
| | | R50D4 | (x, y, z) |

Fig. 1057

House Item Icon Image Data Storage Area 20650b1a5

| House Item ID | House Item Icon Image Data | House Item Name Data |
|---|---|---|
| House Item #1 | House Item Icon Image Data #1 | Glasses |
| House Item #2 | House Item Icon Image Data #2 | Book |
| House Item #3 | House Item Icon Image Data #3 | Pen |
| House Item #4 | House Item Icon Image Data #4 | Nail Clipper |

Fig. 1058

Com. Device Icon Image Data Storage
Area 20650b1a6

| Com. Device ID | Com. Device Icon Image Data | User Name Data |
|---|---|---|
| Com. Device #1 | Com. Device Icon Image Data #1 | User Name #1 |
| Com. Device #2 | Com. Device Icon Image Data #2 | User Name #2 |
| Com. Device #3 | Com. Device Icon Image Data #3 | User Name #3 |

Fig. 1059

House Item Pin-pointing Software Storage Area 20650c

| |
|---|
| House Layout Data Requesting Software 20650c1 |
| House Layout Data Sending/Receiving Software 20650c2 |
| House Layout Data Displaying Software 20650c3 |
| Room Layout Data Requesting Software 20650c4 |
| Room Layout Data Sending/Receiving Software 20650c5 |
| Room Layout Data Displaying Software 20650c6 |
| House Item List Displaying Software 20650c6a |
| House Item Selecting Software 20650c7 |
| Selected House Item ID Sending/Receiving Software 20650c8 |
| Calculated GPS Data Sending/Receiving Software 20650c11 |
| Selected House Item Displaying Software 20650c12 |
| Com. Device List Displaying Software 20650c12a |
| Com. Device Selecting Software 20650c13 |
| Selected Com. Device ID Sending/Receiving Software 20650c14 |
| Calculated GPS Data Sending/Receiving Software 20650c17 |
| Selected Com. Device Displaying Software 20650c18 |

Fig. 1060
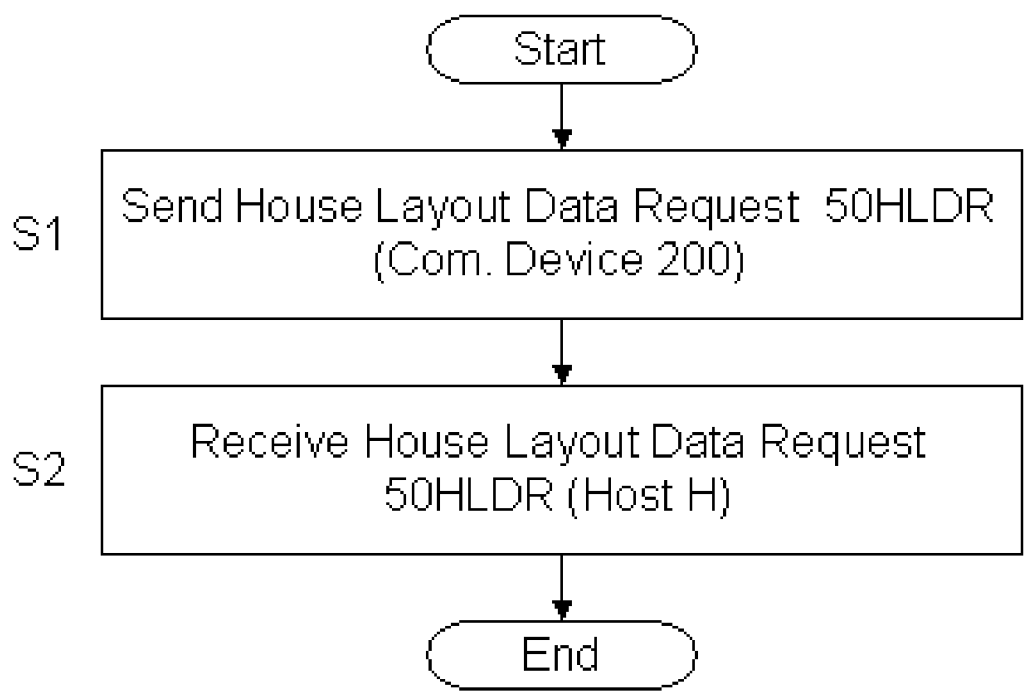

Fig. 1061
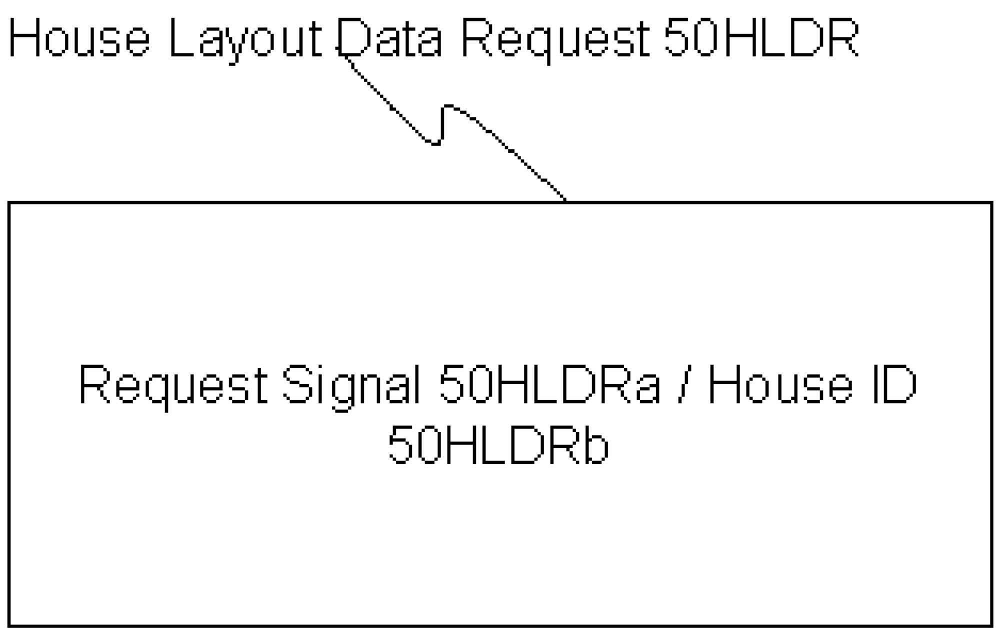

Fig. 1062
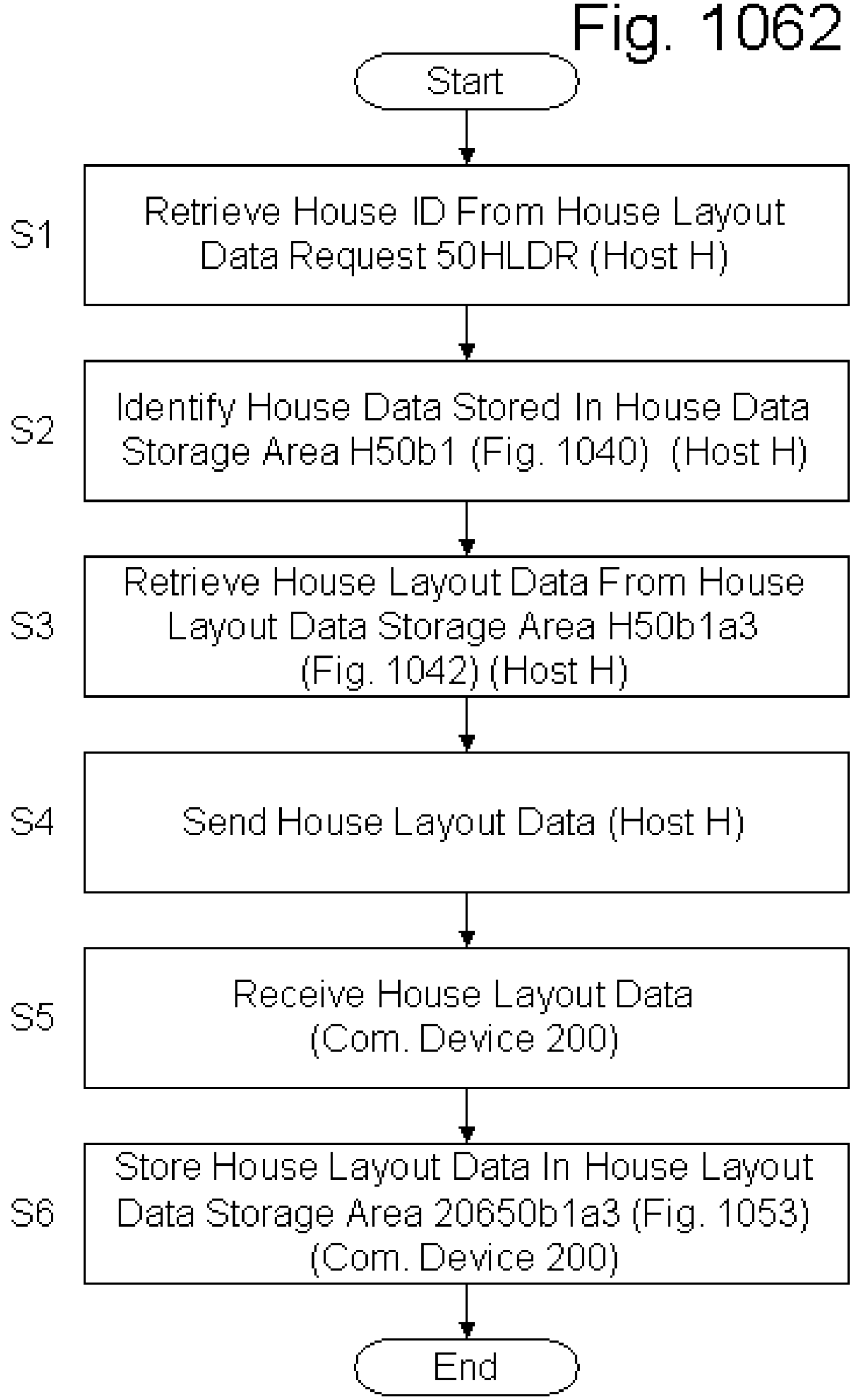

Fig. 1063
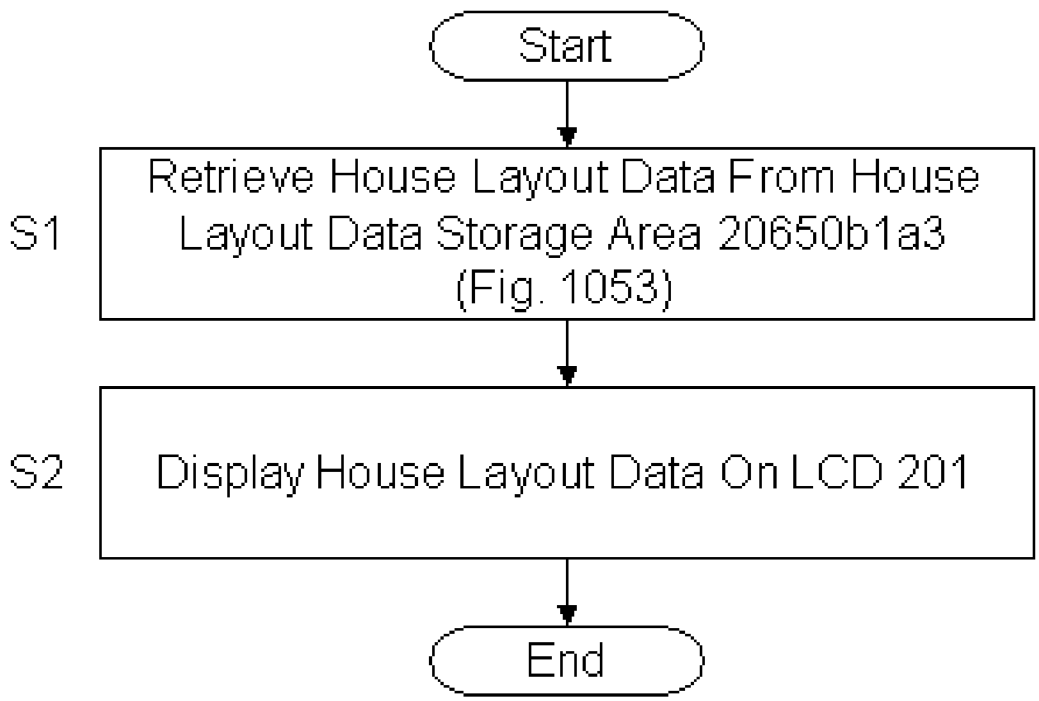

Fig. 1064
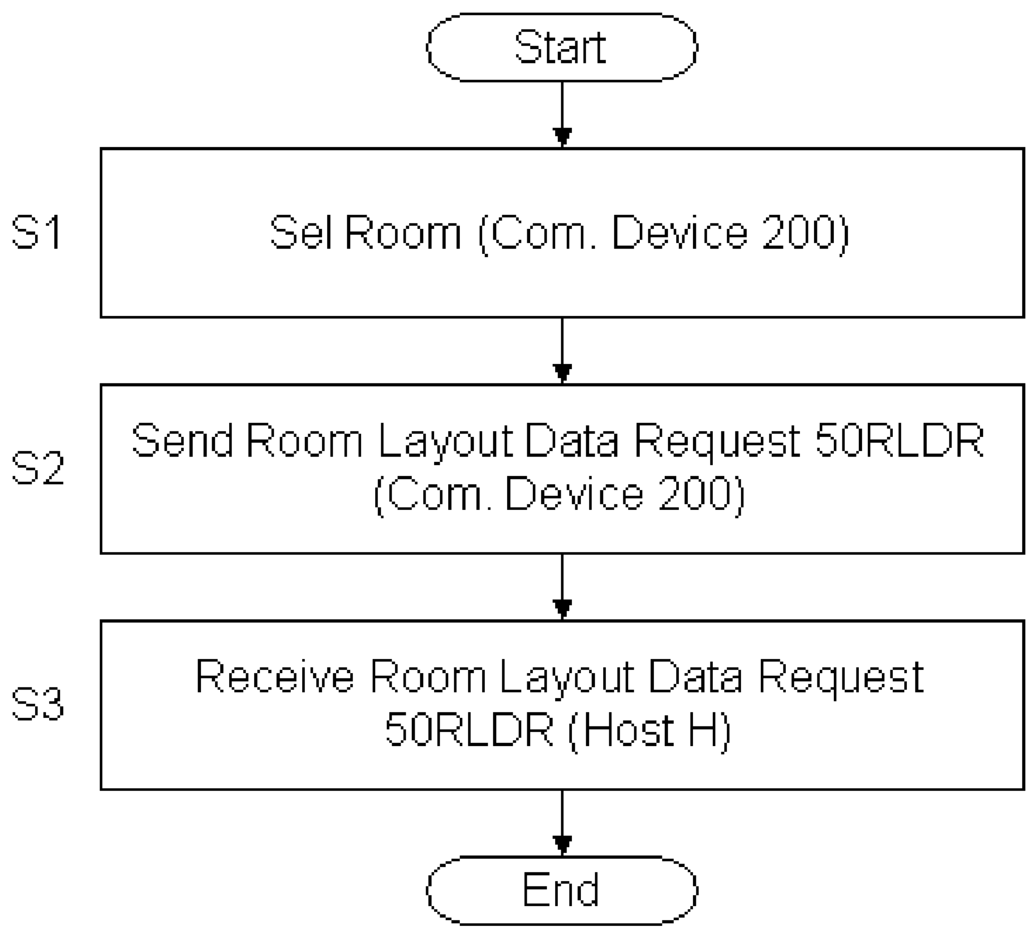

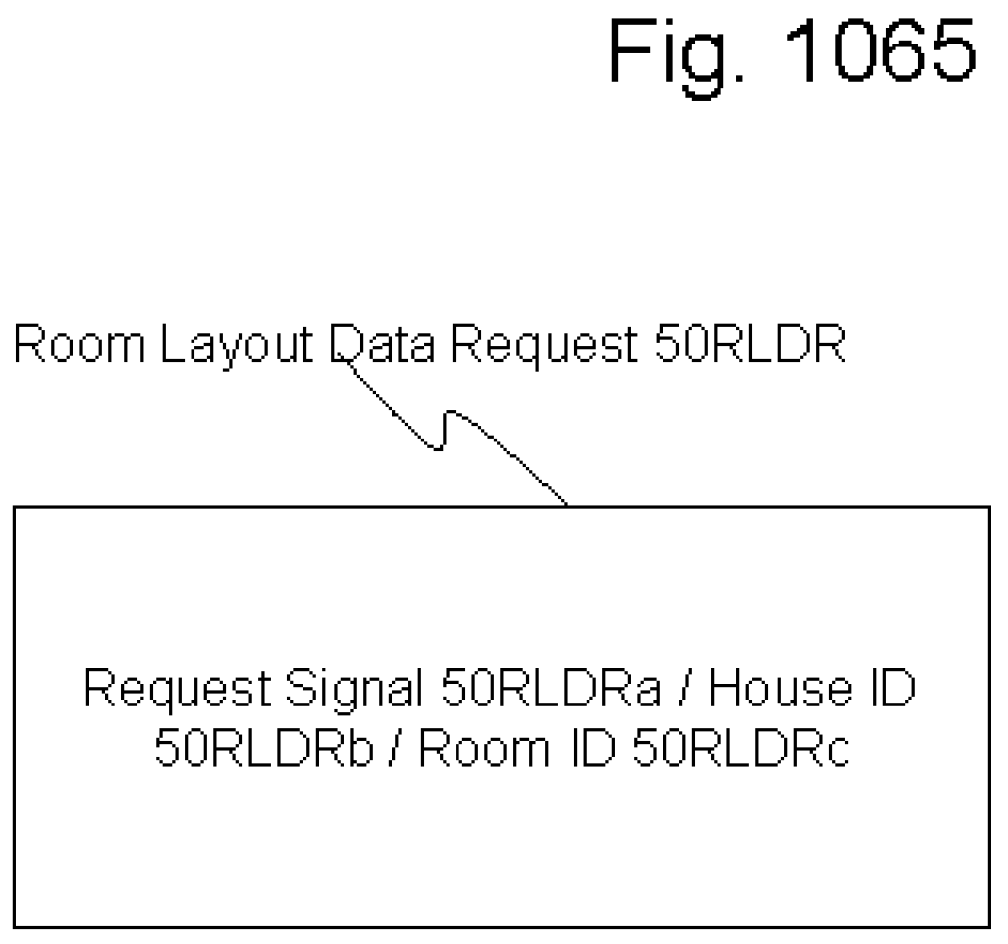

Fig. 1065

Room Layout Data Request 50RLDR

Request Signal 50RLDRa / House ID 50RLDRb / Room ID 50RLDRc

Fig. 1066
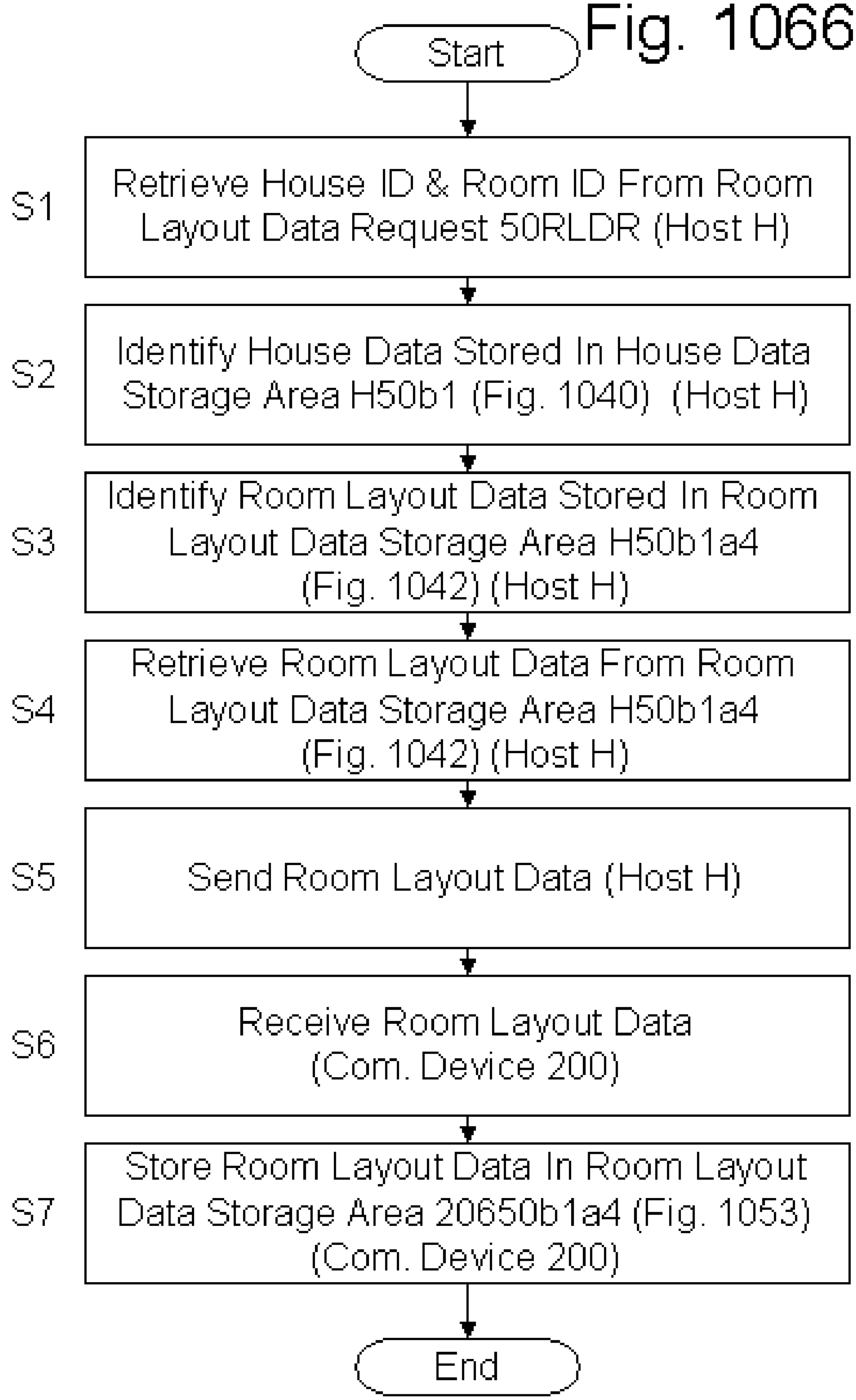

Fig. 1067
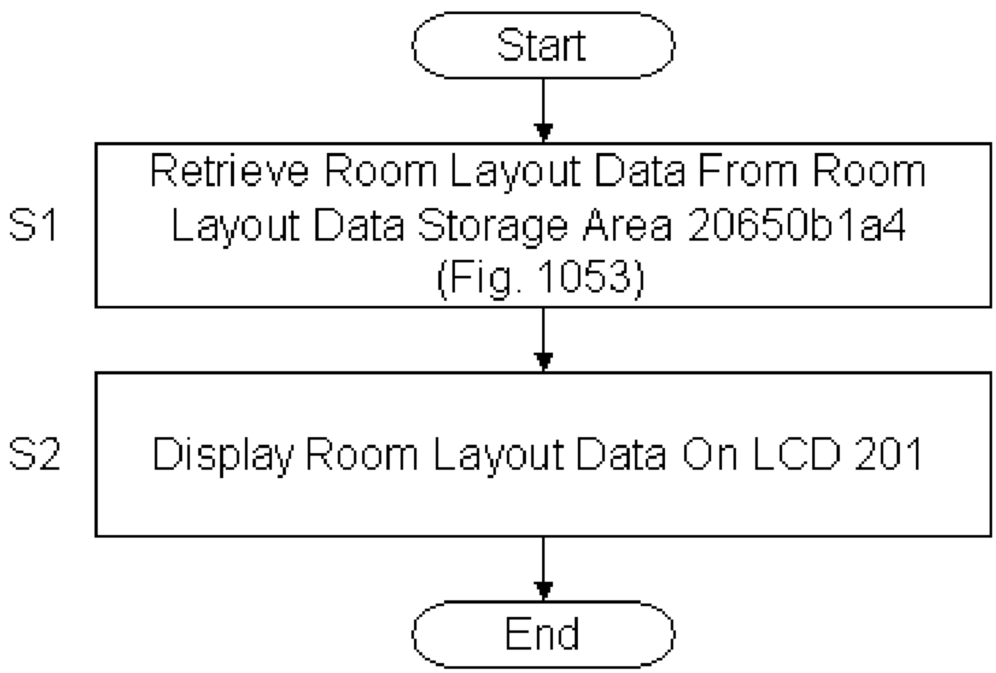

Fig. 1068
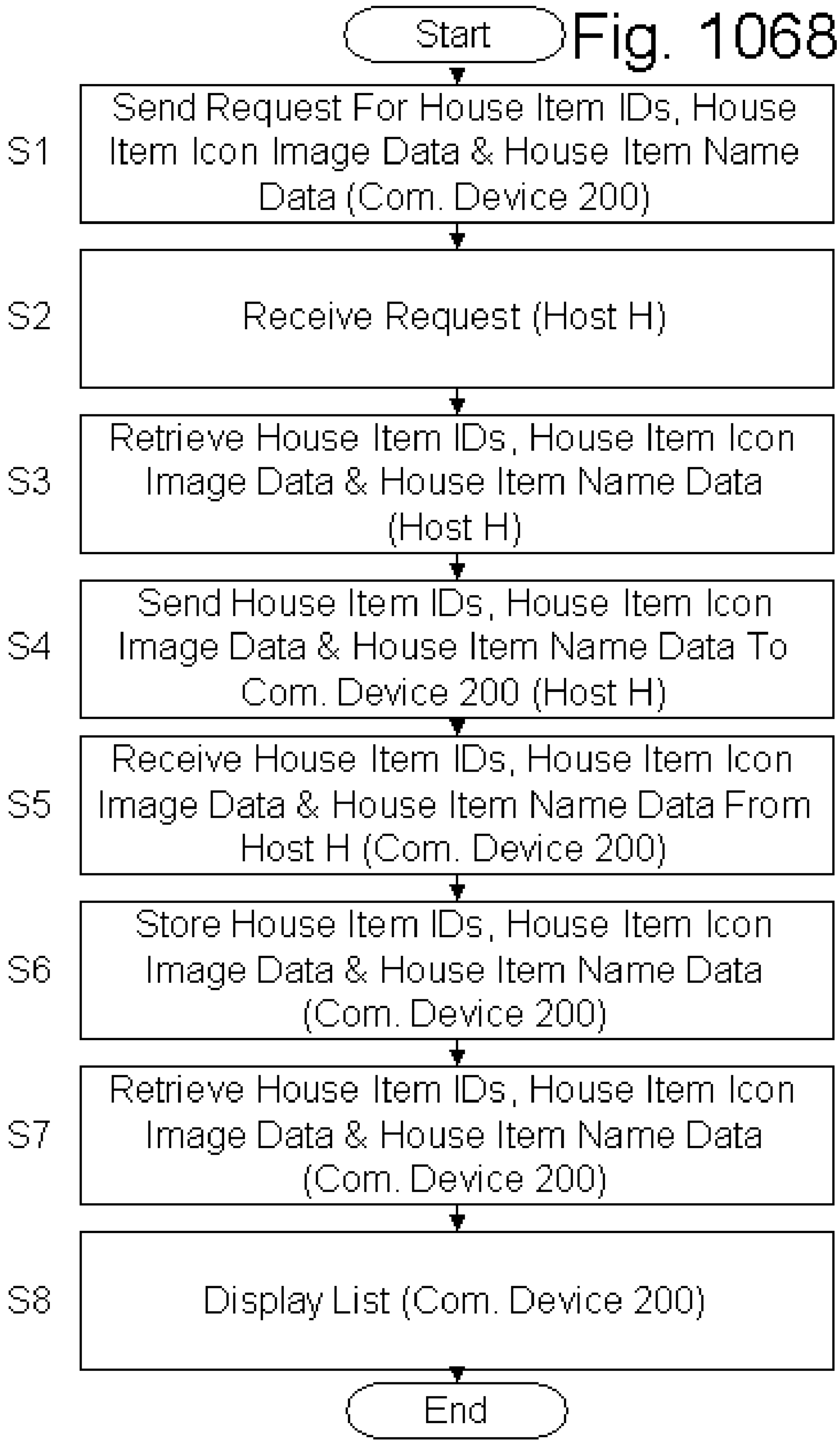

Fig. 1069
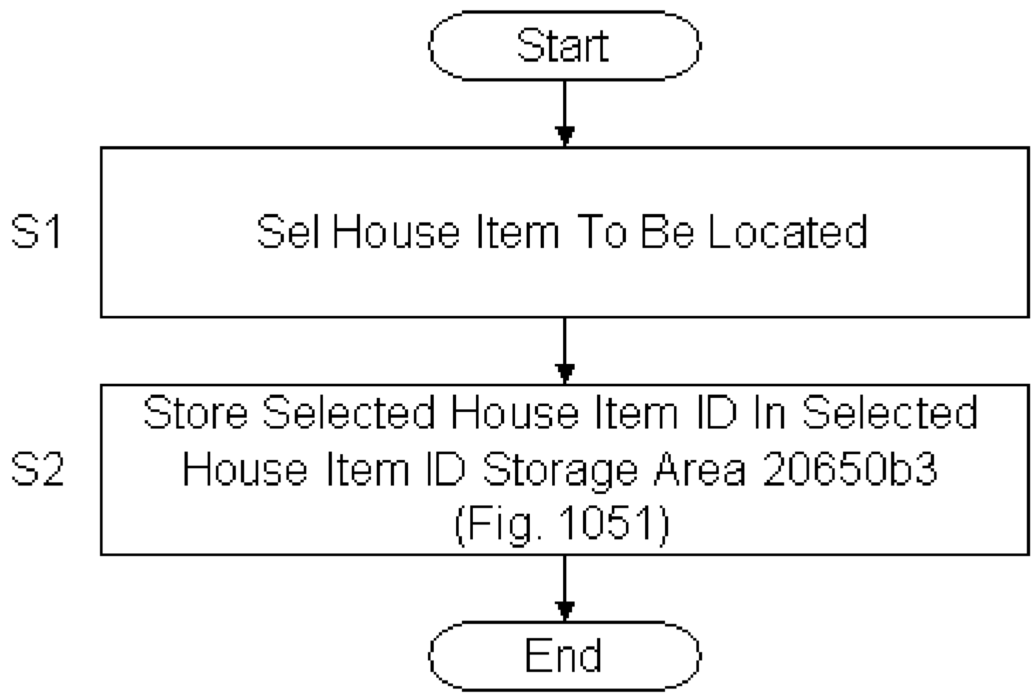

Fig. 1070
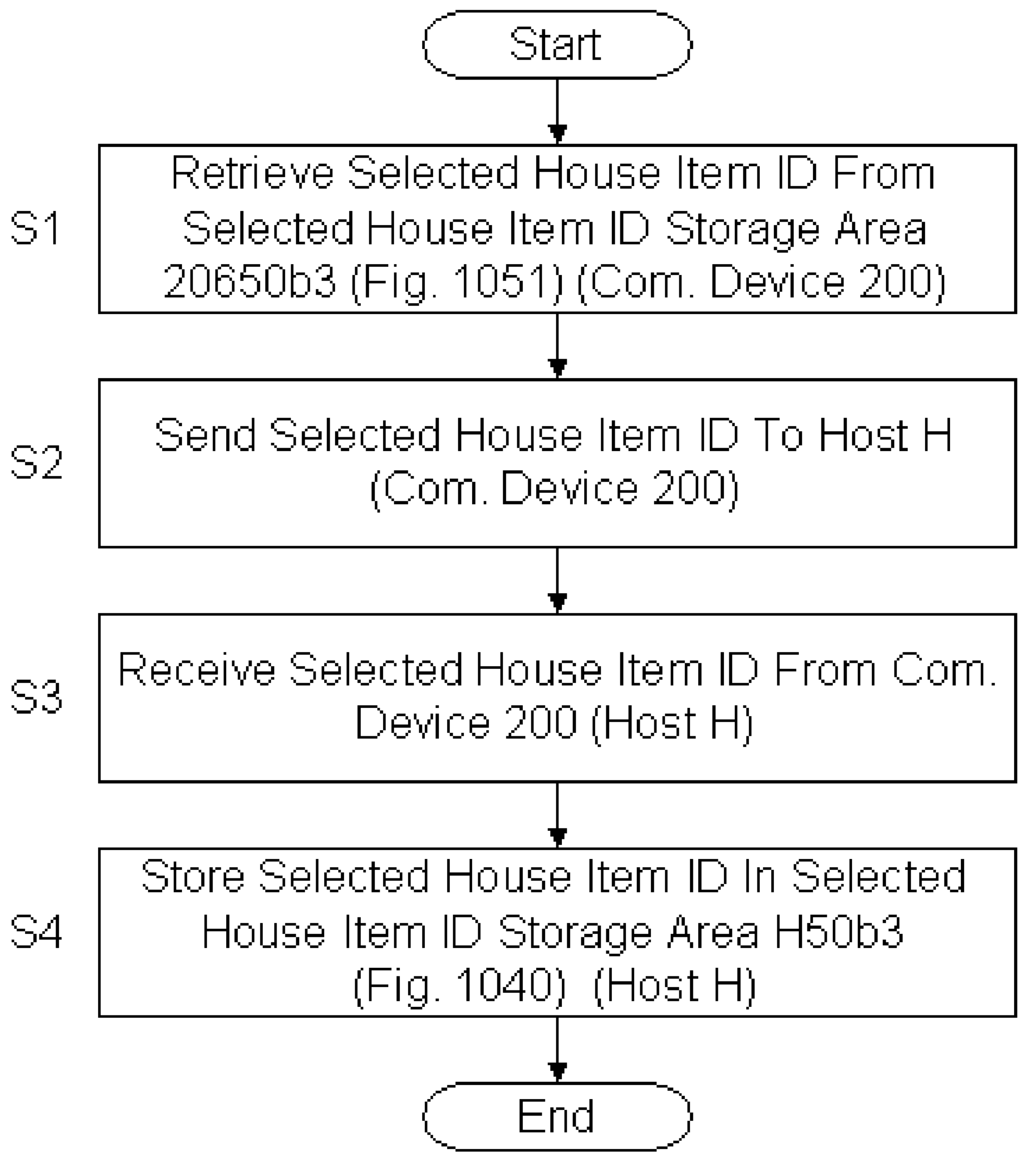

Fig. 1071
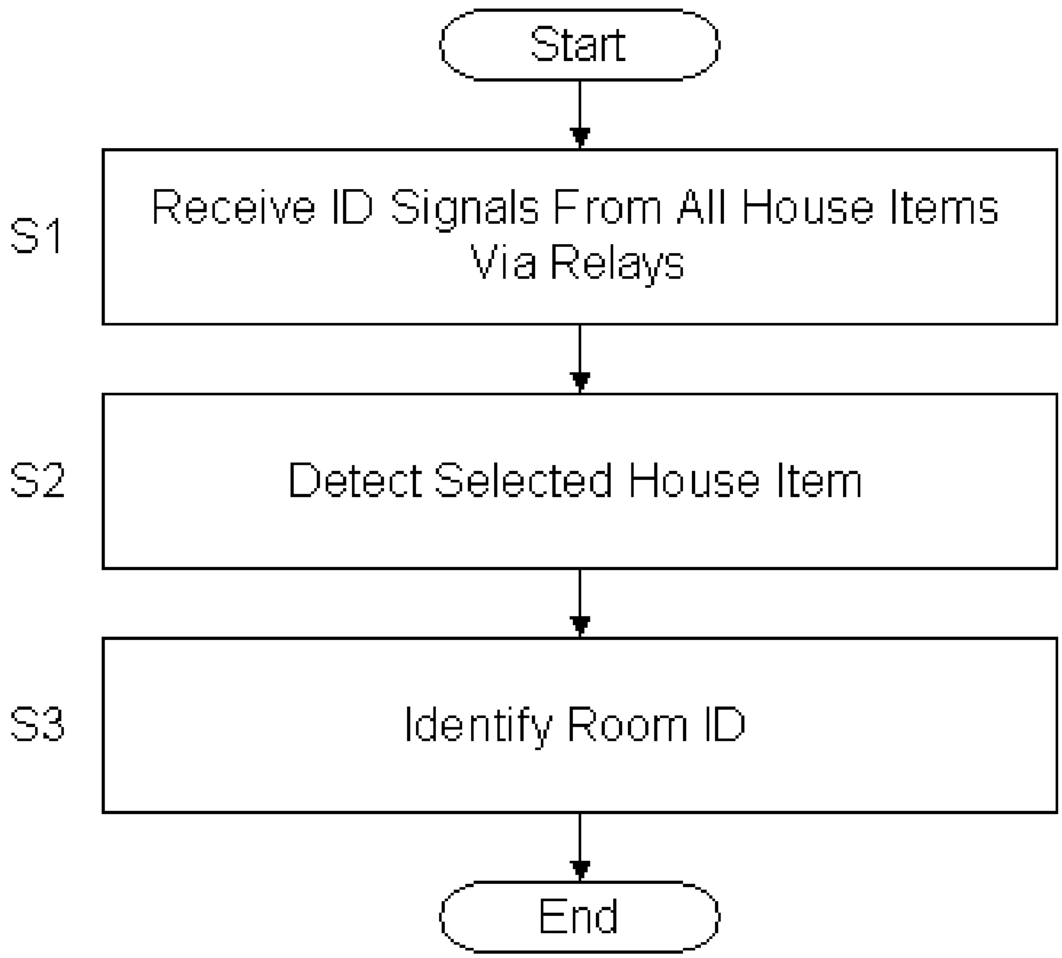

Fig. 1072
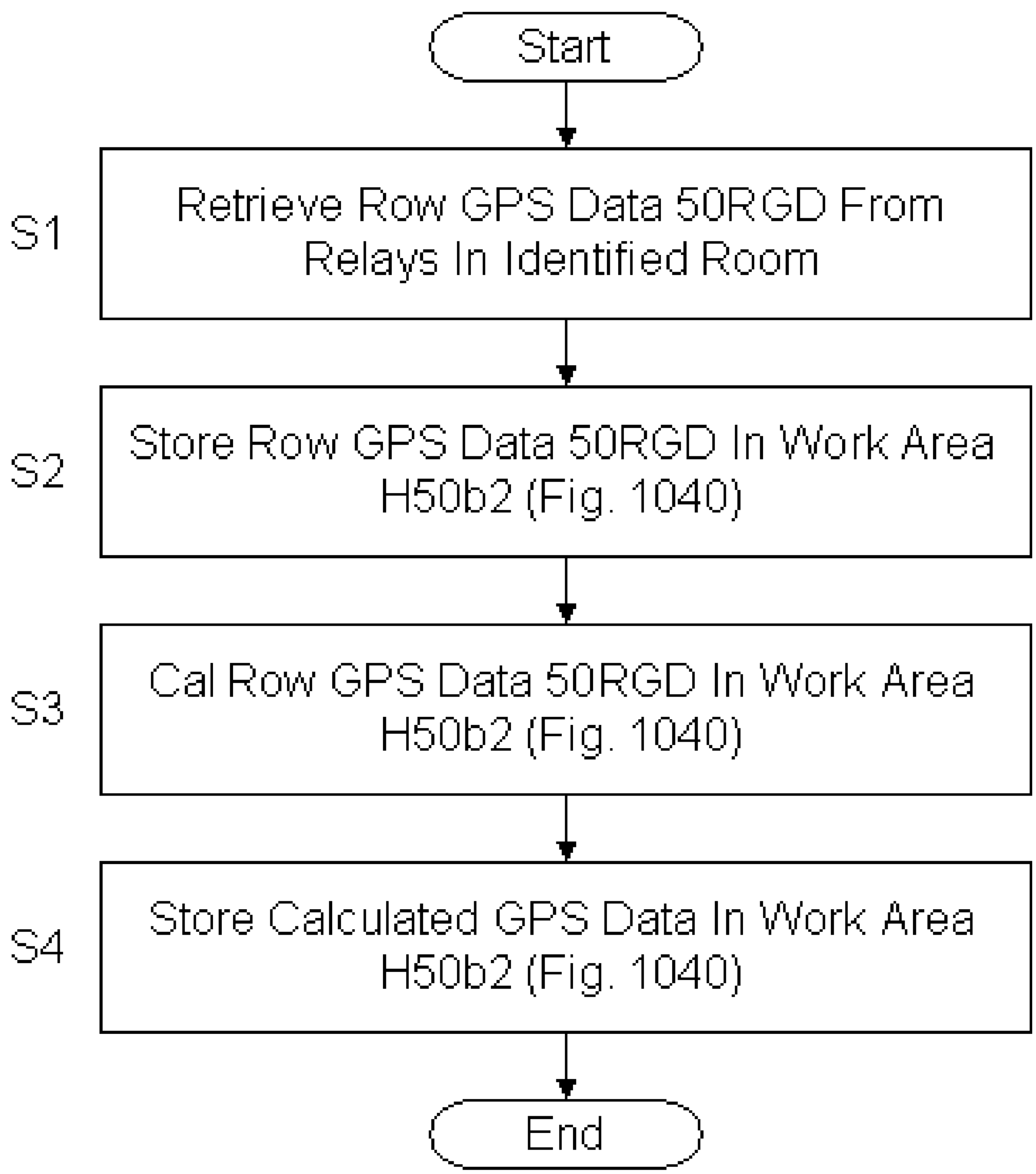

Fig. 1073
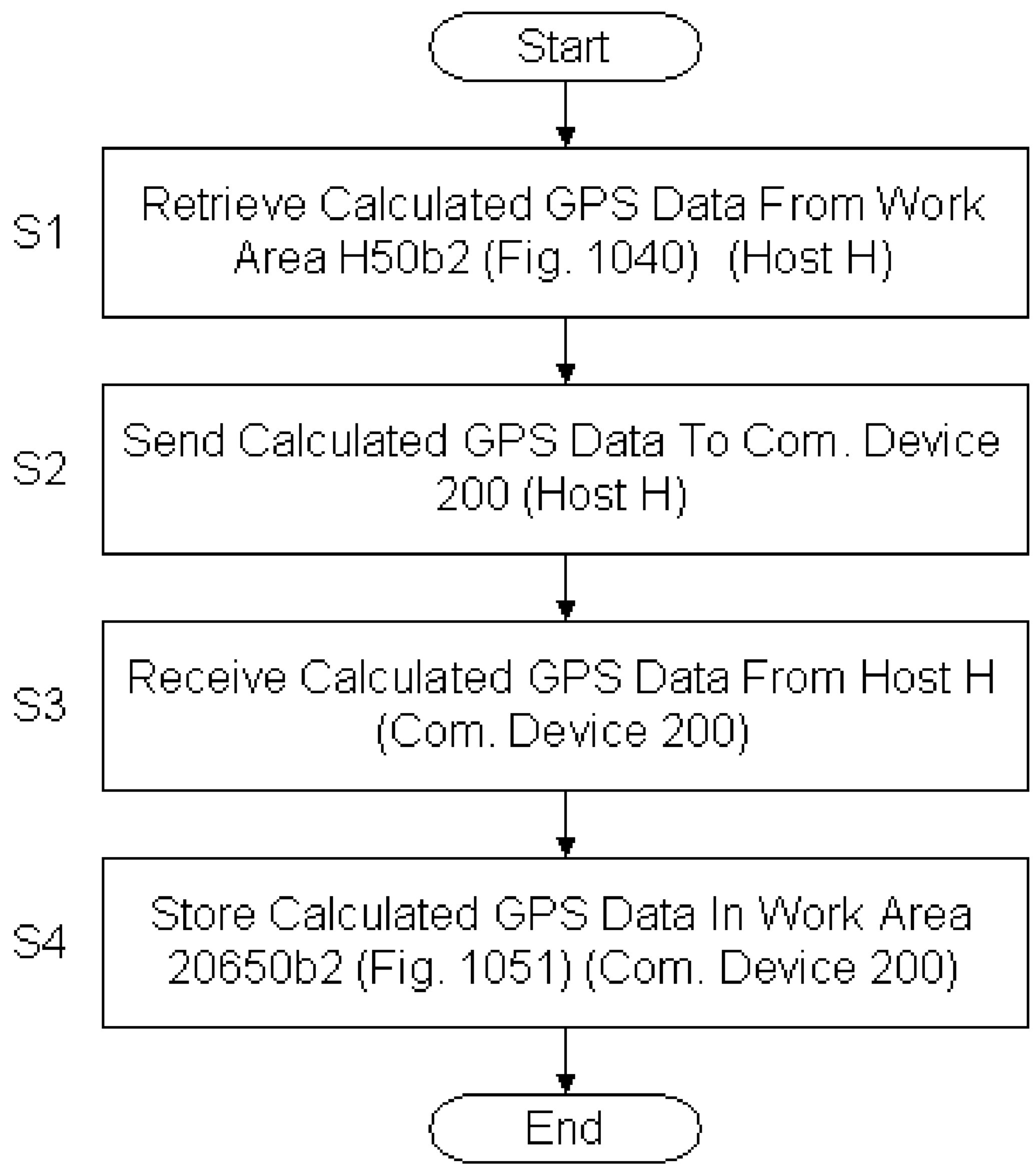

Fig. 1074
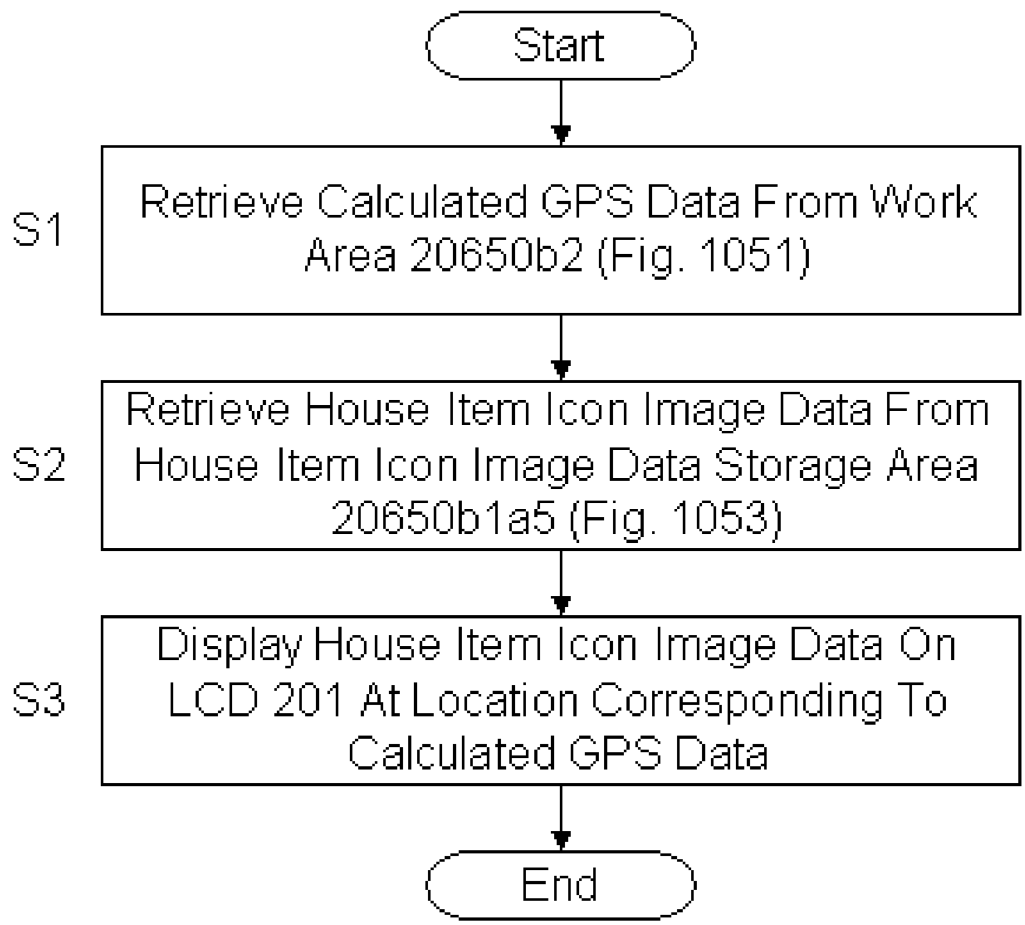

Fig. 1075
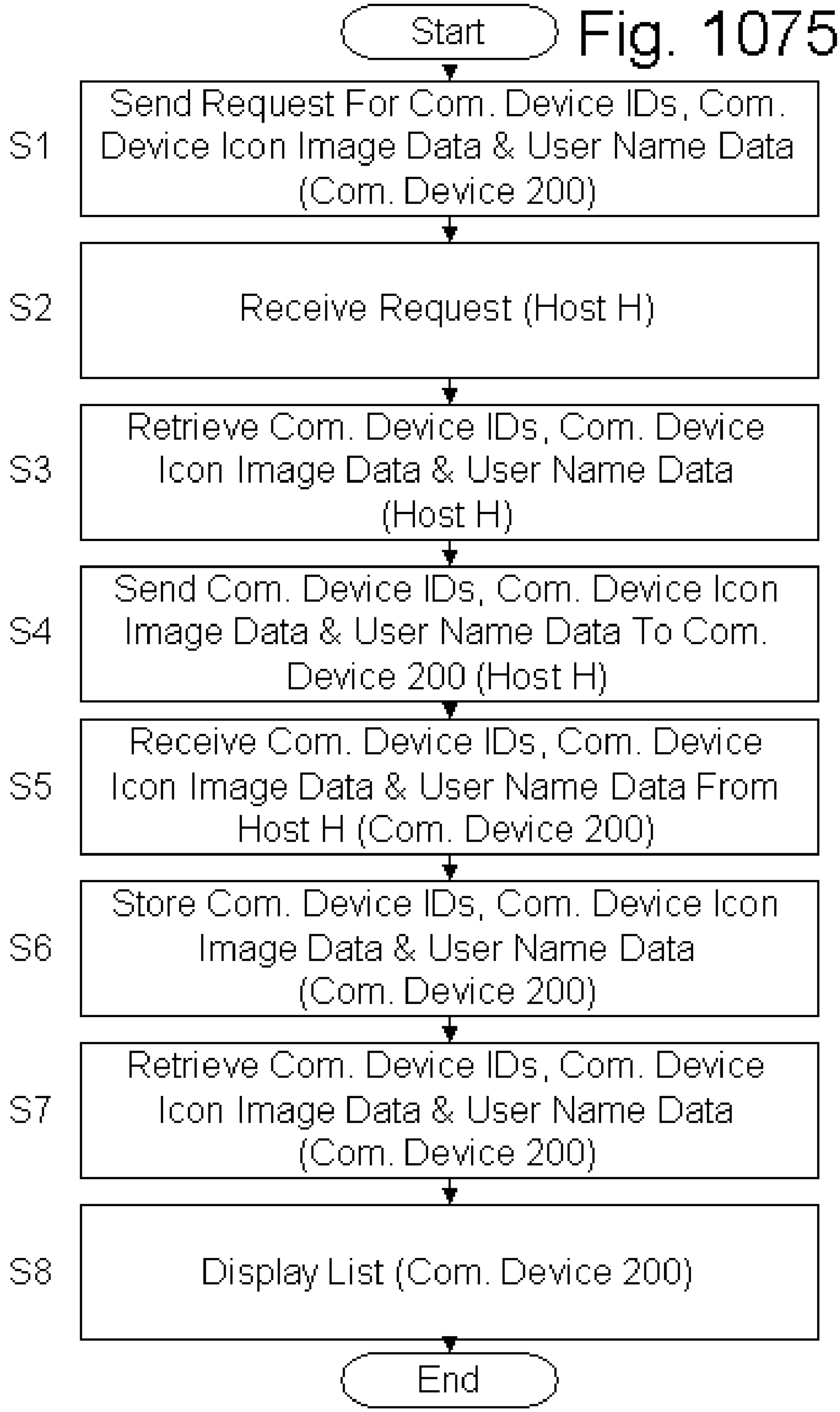

Fig. 1076
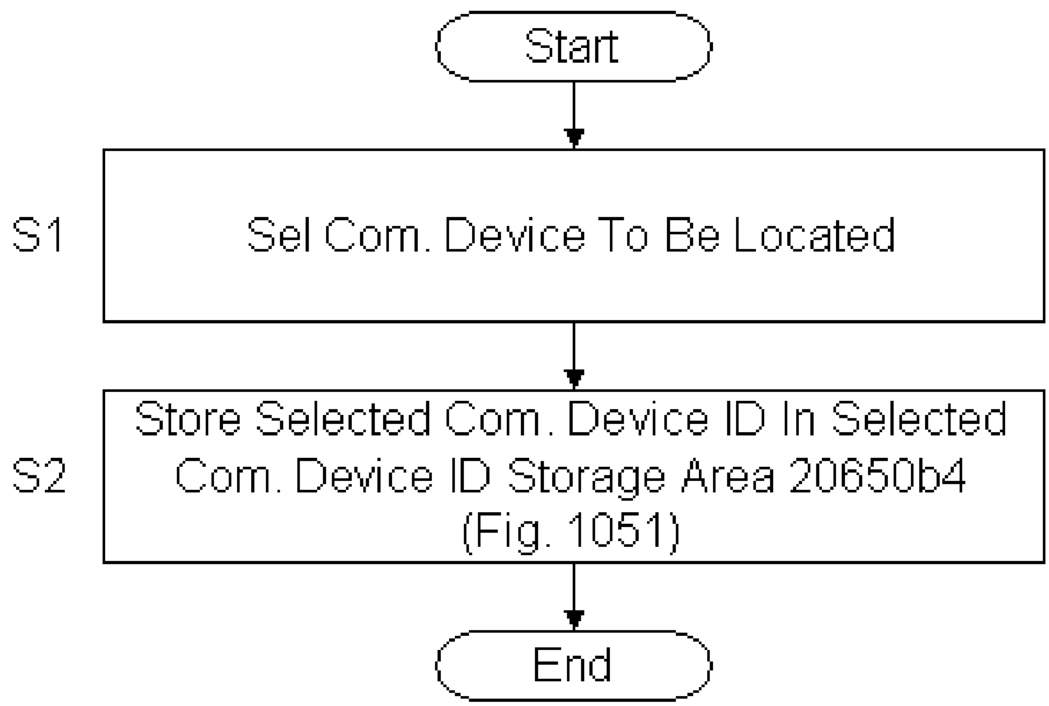

Fig. 1077
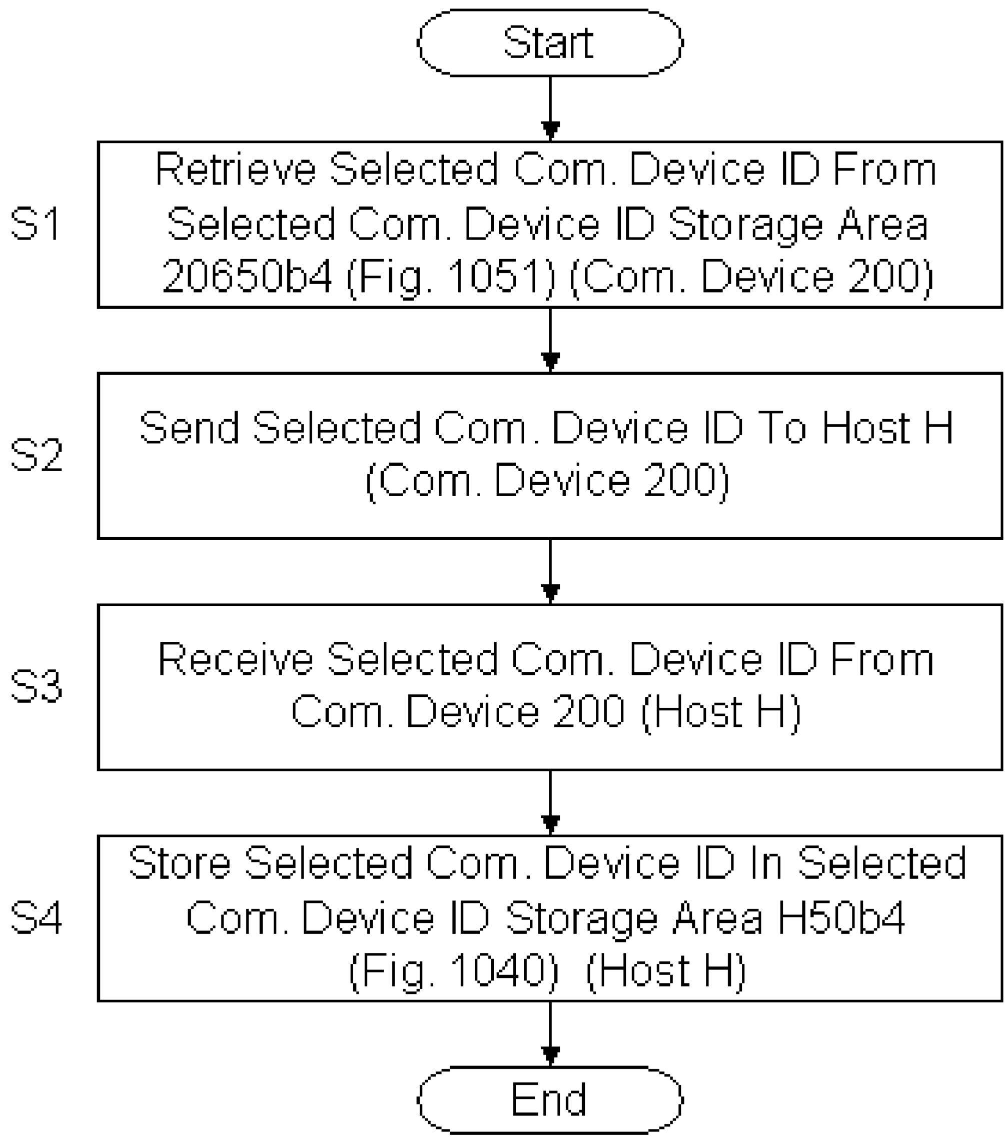

Fig. 1078
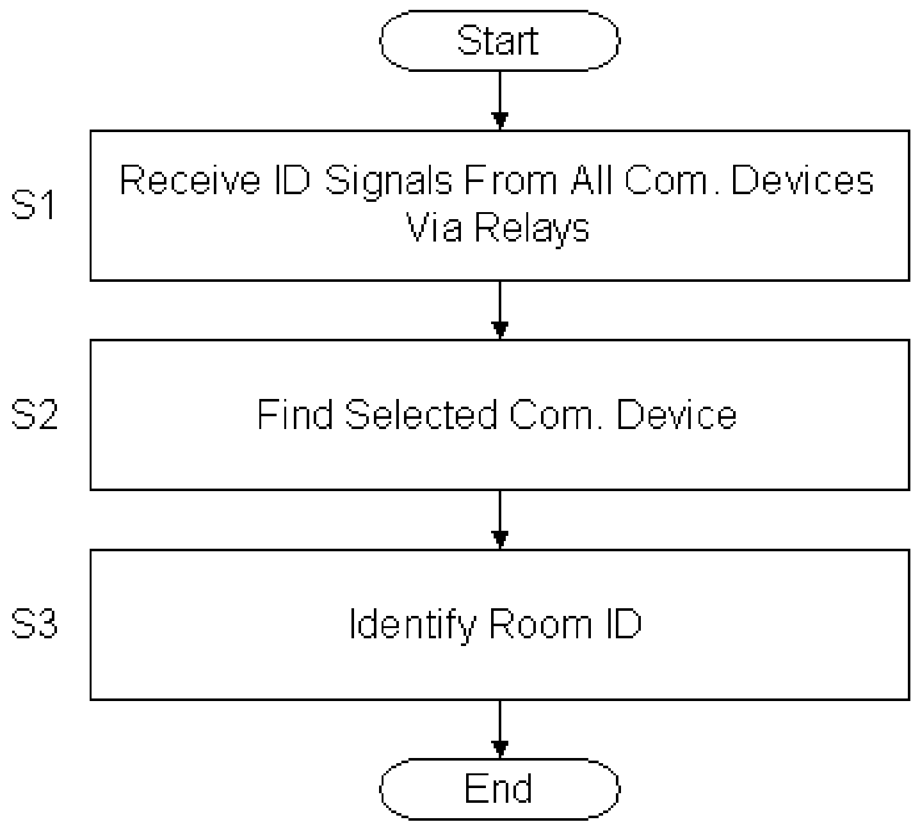

Fig. 1079
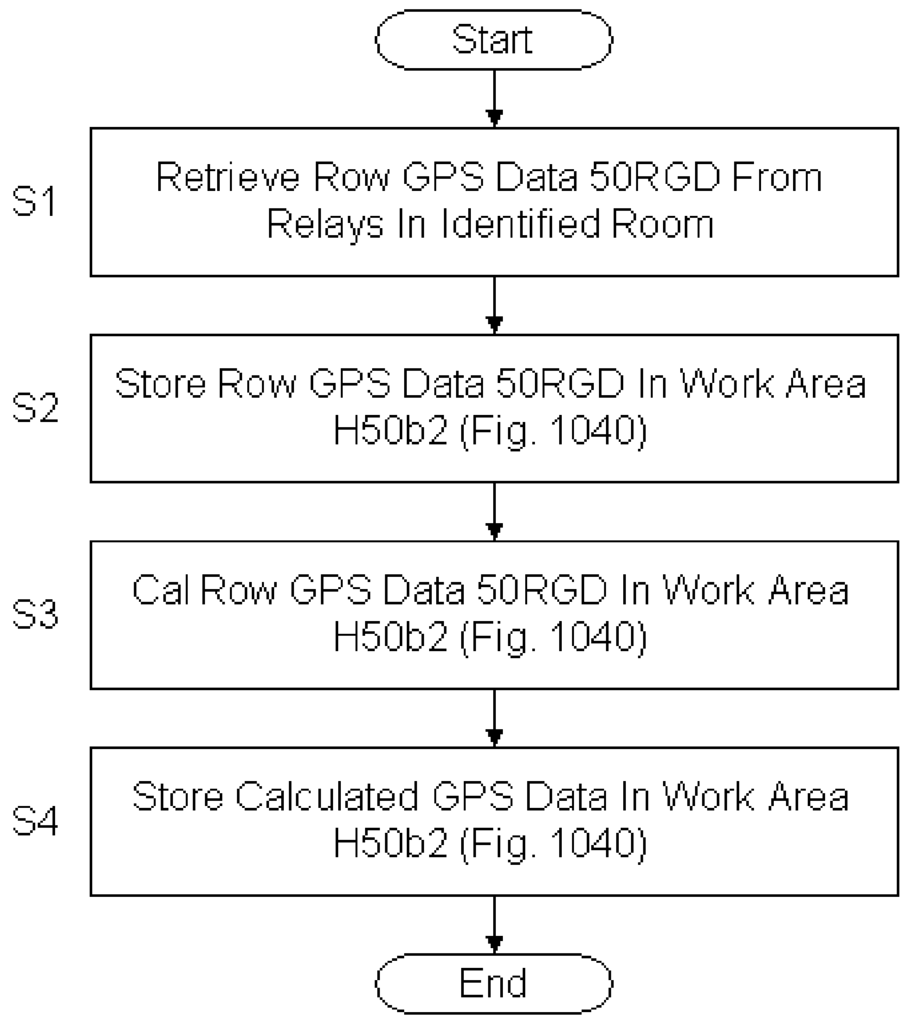

Fig. 1080
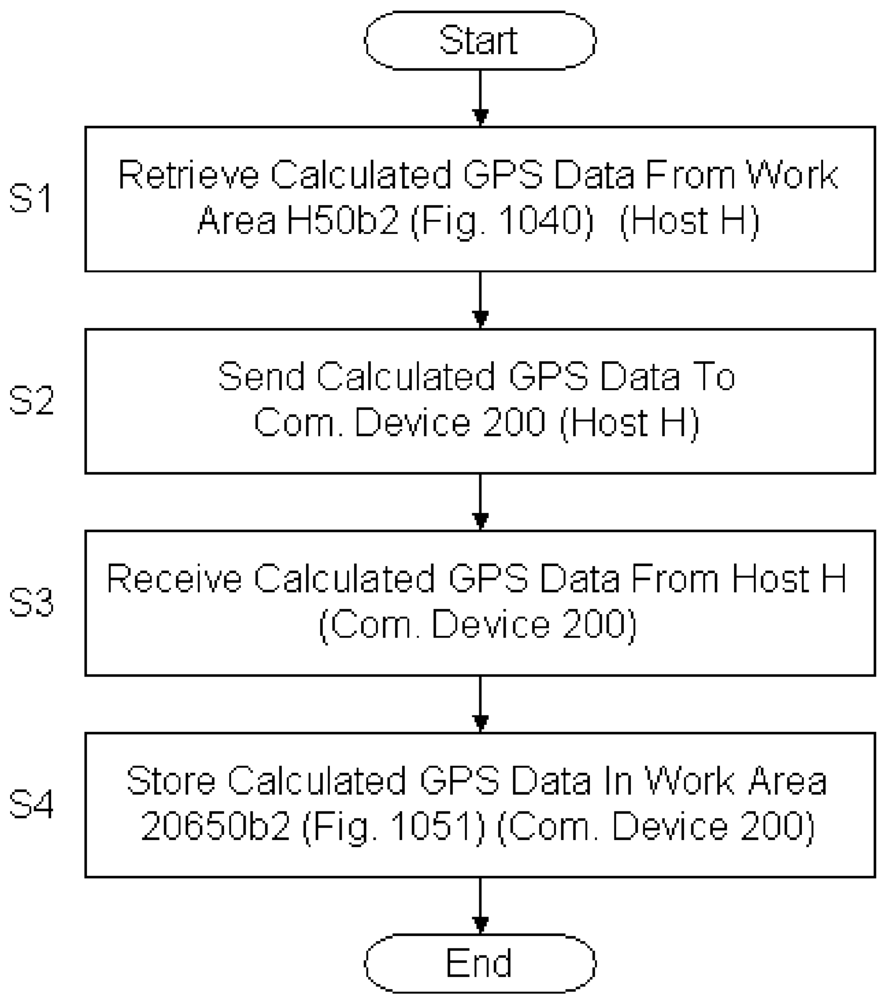

Fig. 1081
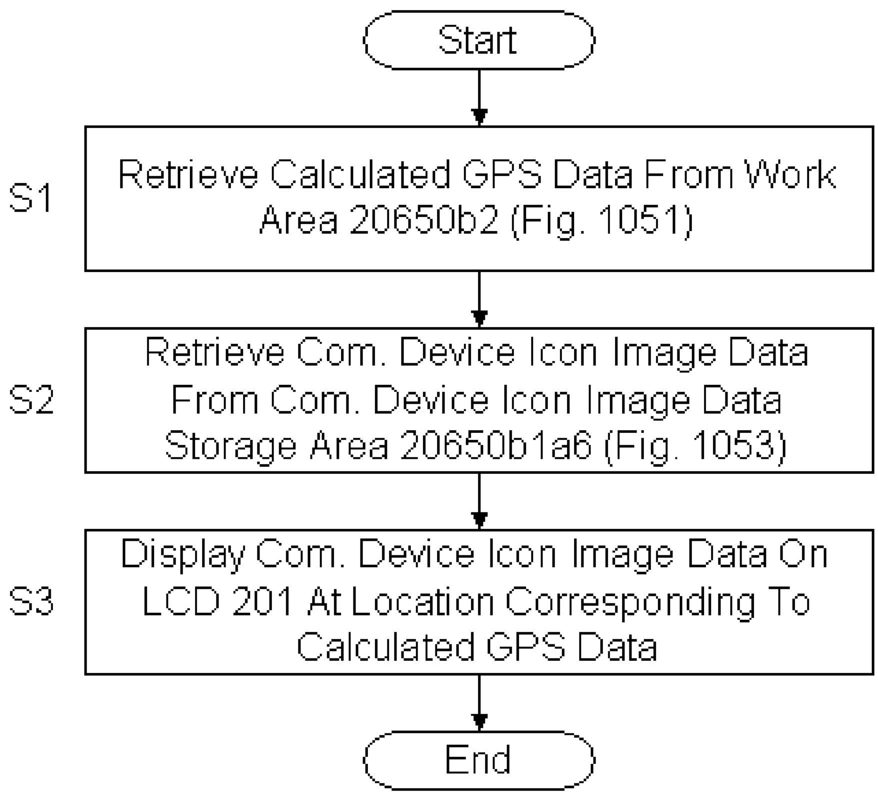

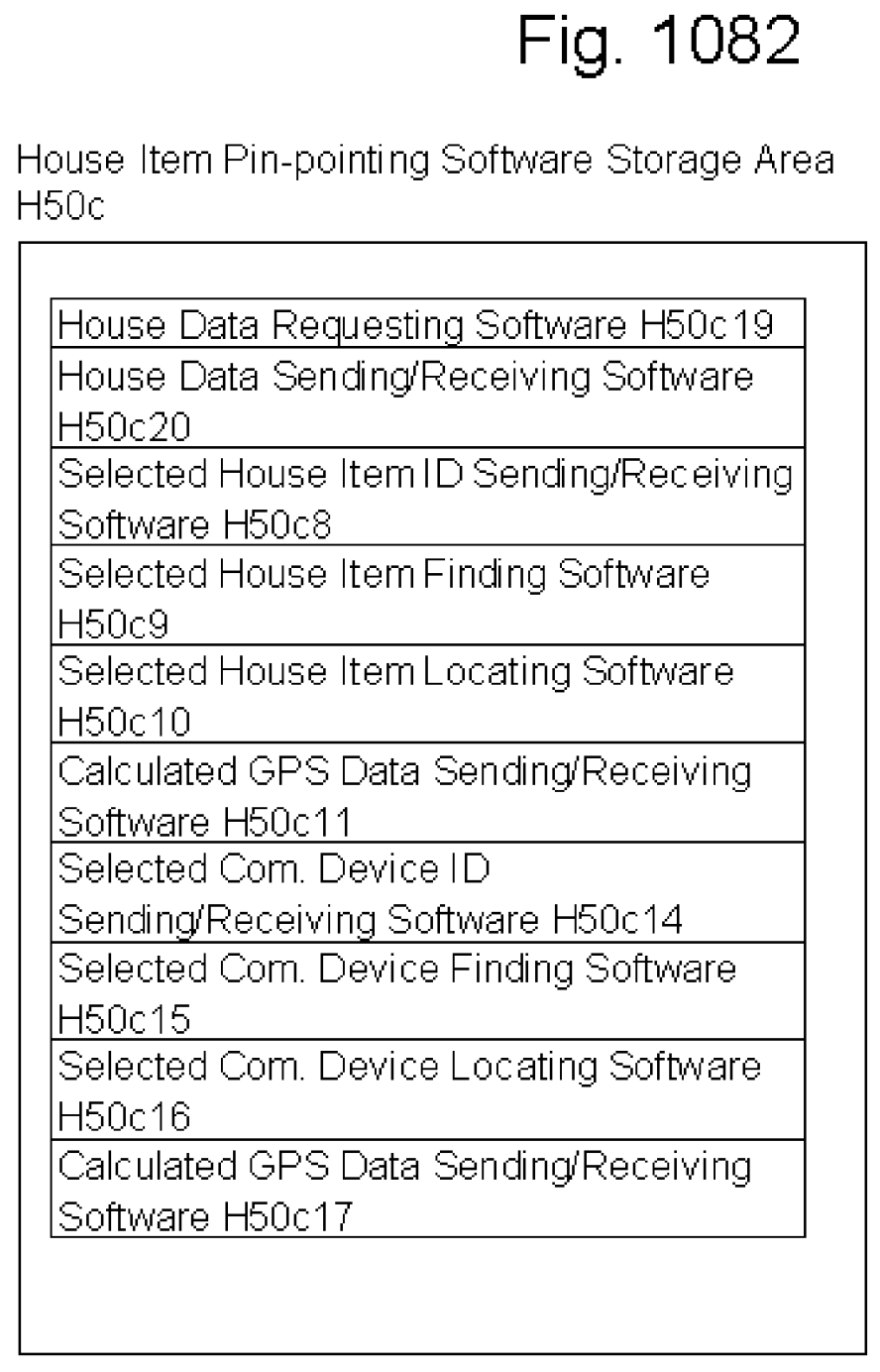

Fig. 1082

House Item Pin-pointing Software Storage Area H50c

| |
|---|
| House Data Requesting Software H50c19 |
| House Data Sending/Receiving Software H50c20 |
| Selected House Item ID Sending/Receiving Software H50c8 |
| Selected House Item Finding Software H50c9 |
| Selected House Item Locating Software H50c10 |
| Calculated GPS Data Sending/Receiving Software H50c11 |
| Selected Com. Device ID Sending/Receiving Software H50c14 |
| Selected Com. Device Finding Software H50c15 |
| Selected Com. Device Locating Software H50c16 |
| Calculated GPS Data Sending/Receiving Software H50c17 |

Fig. 1083

House Item Pin-pointing Software Storage Area 20650c

| |
|---|
| House Data Requesting Software 20650c19 |
| House Data Sending/Receiving Software 20650c20 |
| House Layout Data Displaying Software 20650c3 |
| Room Layout Data Displaying Software 20650c6 |
| House Item List Displaying Software 20650c6a |
| House Item Selecting Software 20650c7 |
| Selected House Item ID Sending/Receiving Software 20650c8 |
| Calculated GPS Data Sending/Receiving Software 20650c11 |
| Selected House Item Displaying Software 20650c12 |
| Com. Device List Displaying Software 20650c12a |
| Com. Device Selecting Software 20650c13 |
| Selected Com. Device ID Sending/Receiving Software 20650c14 |
| Calculated GPS Data Sending/Receiving Software 20650c17 |
| Selected Com. Device Displaying Software 20650c18 |

Fig. 1084
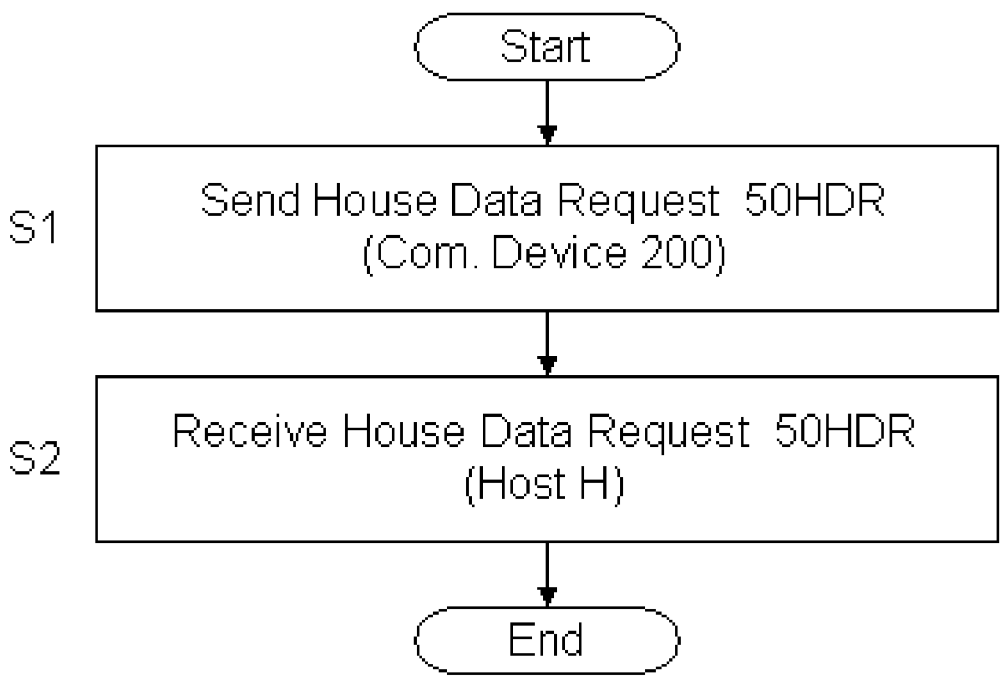

Fig. 1085
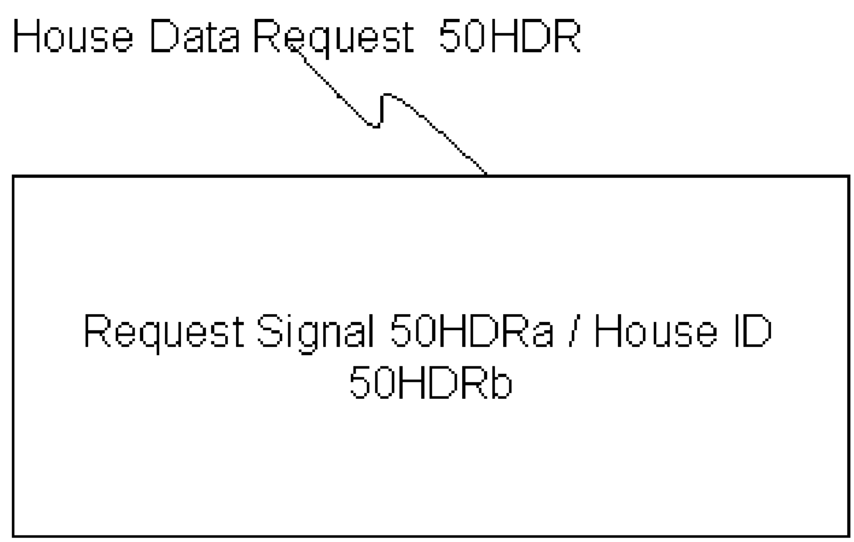

Fig. 1086
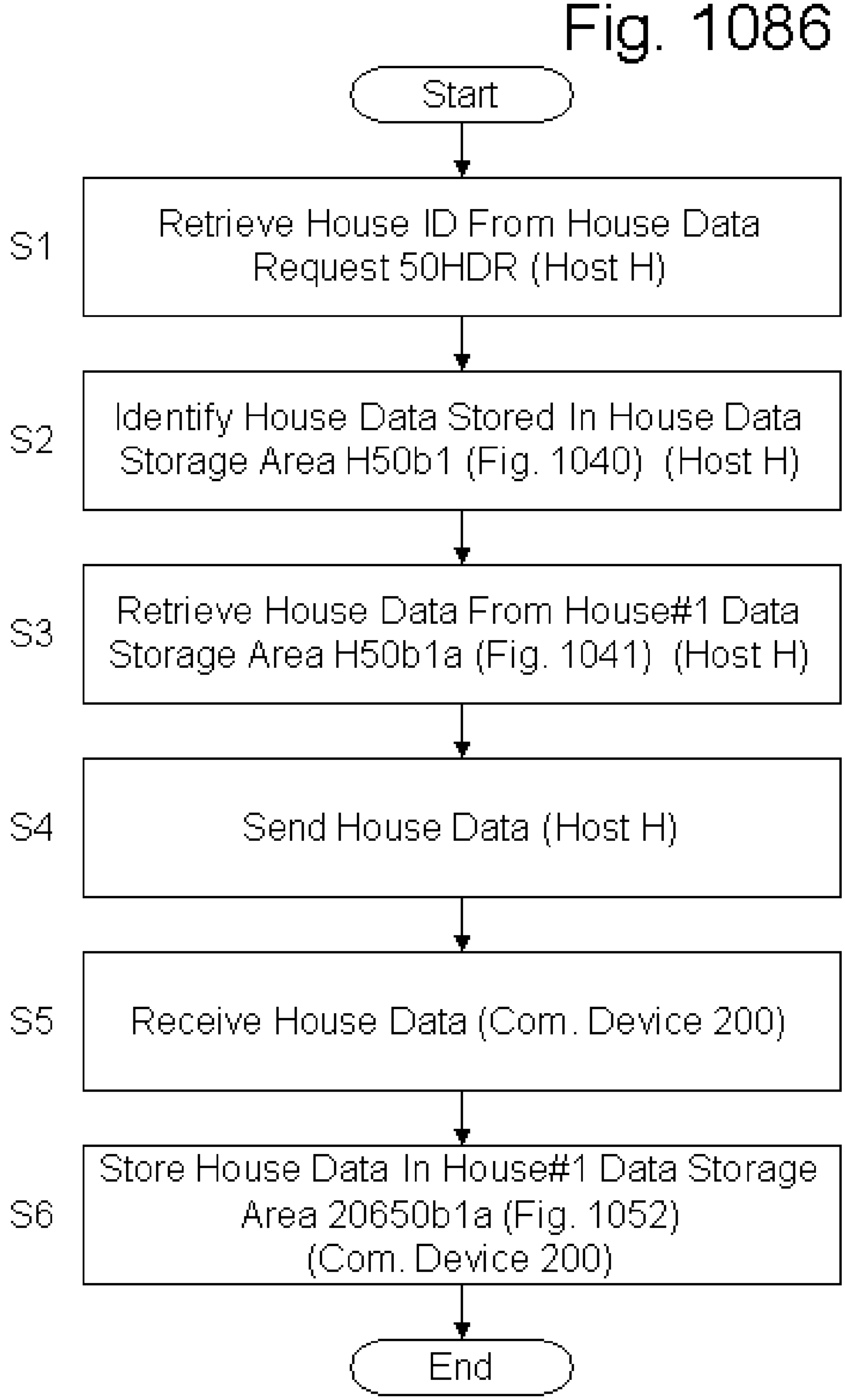

Fig. 1087
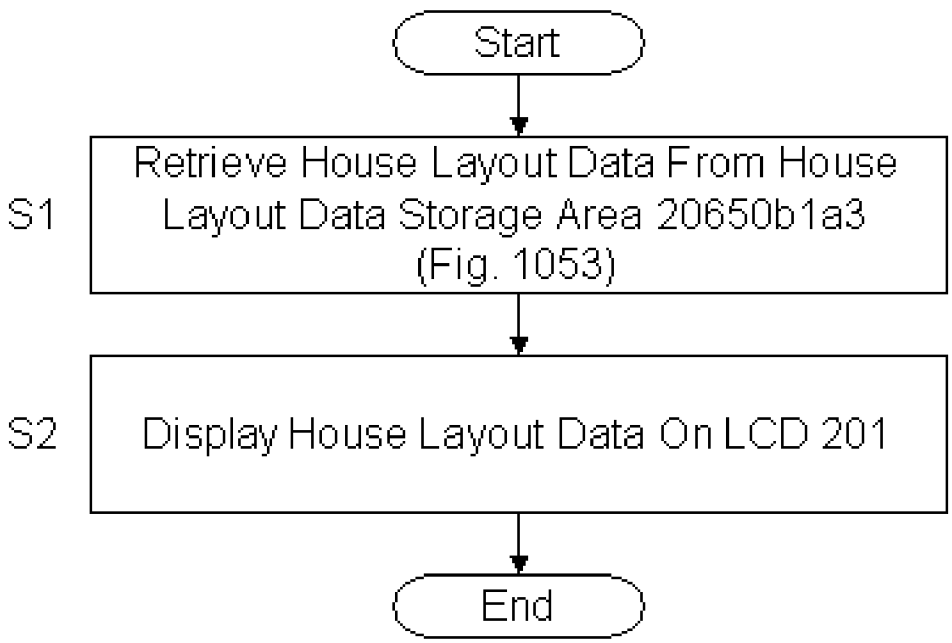

Fig. 1088
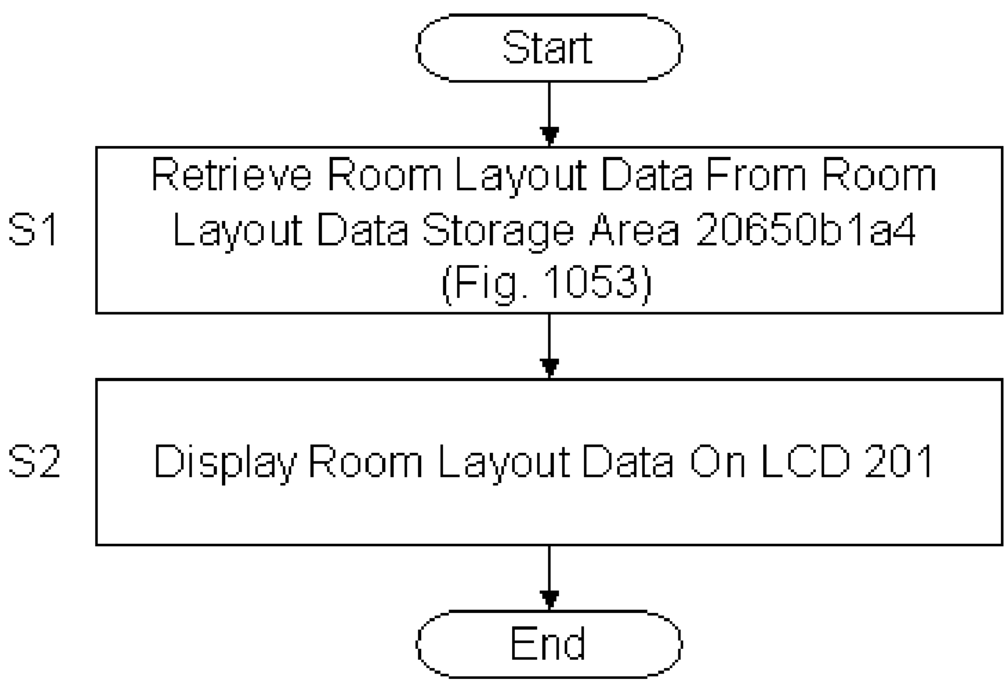

Fig. 1089
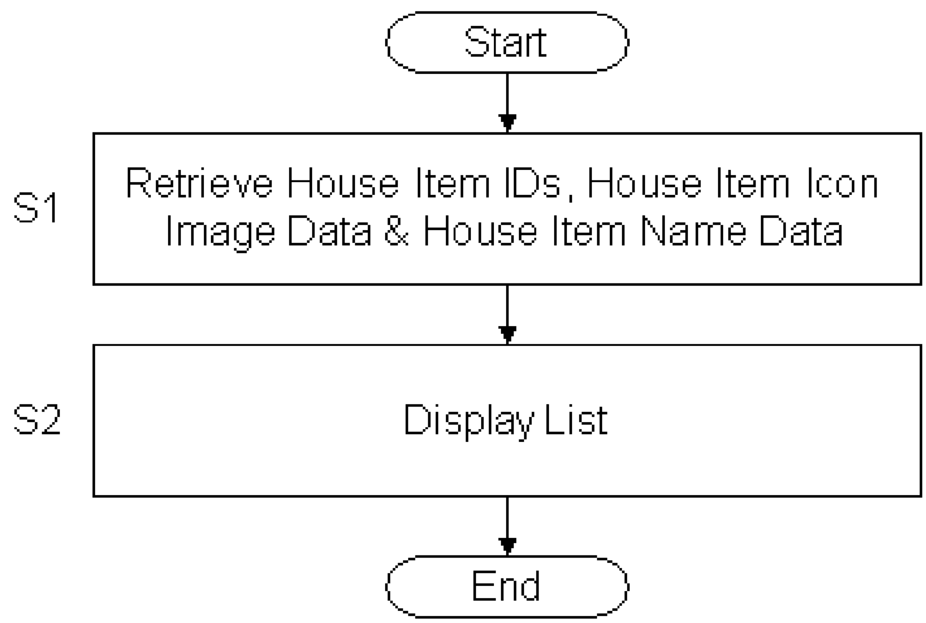

Fig. 1090
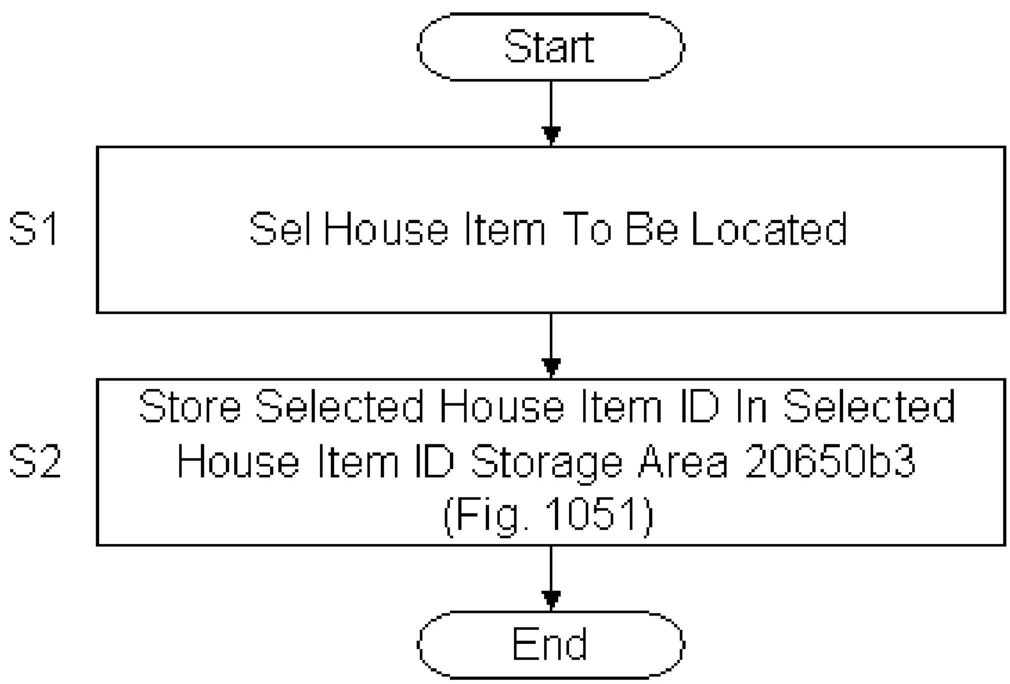

Fig. 1091
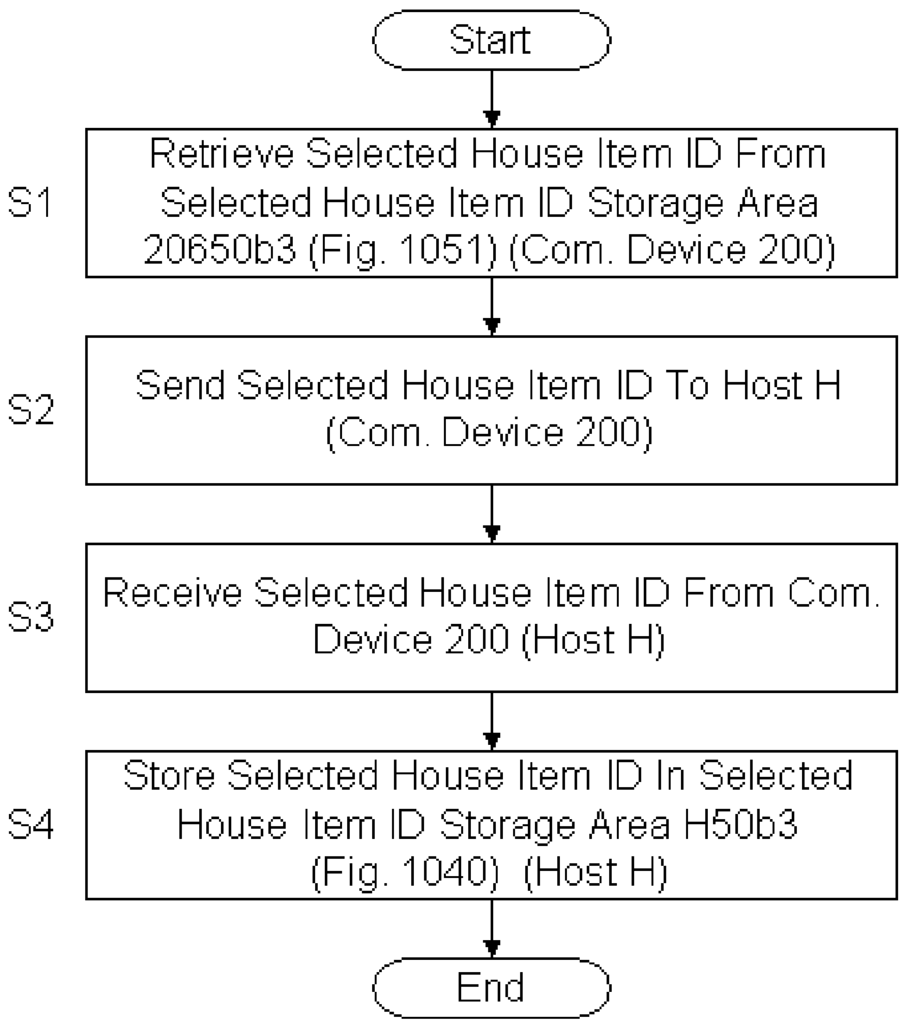

Fig. 1092
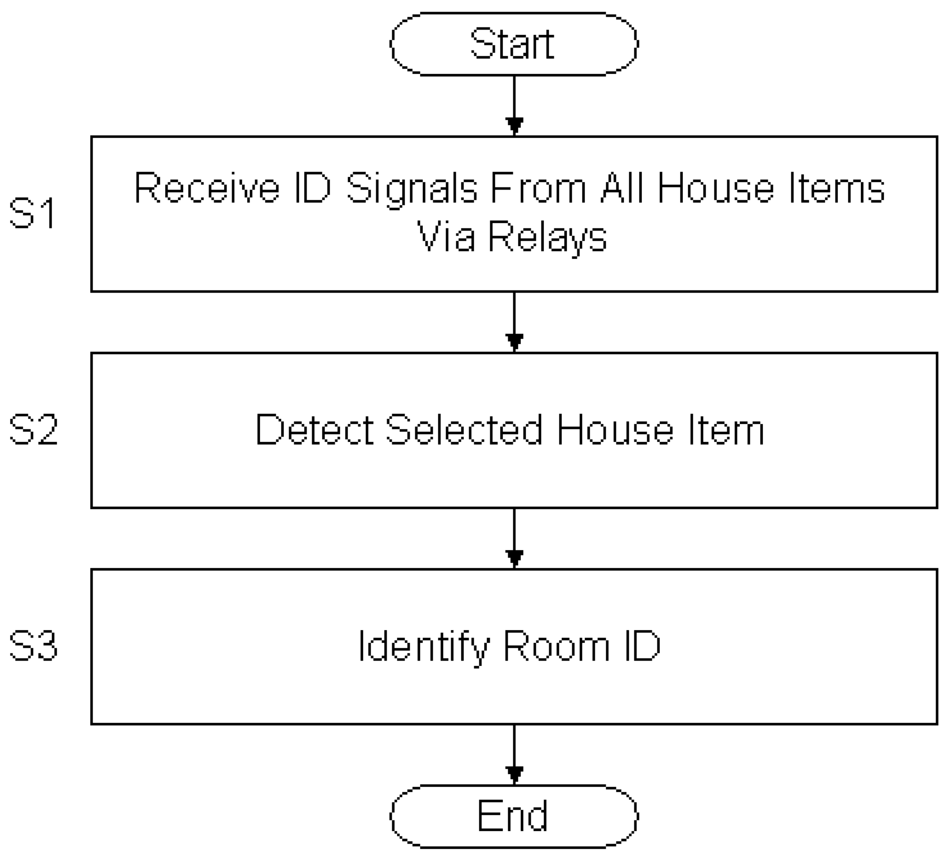

Fig. 1093
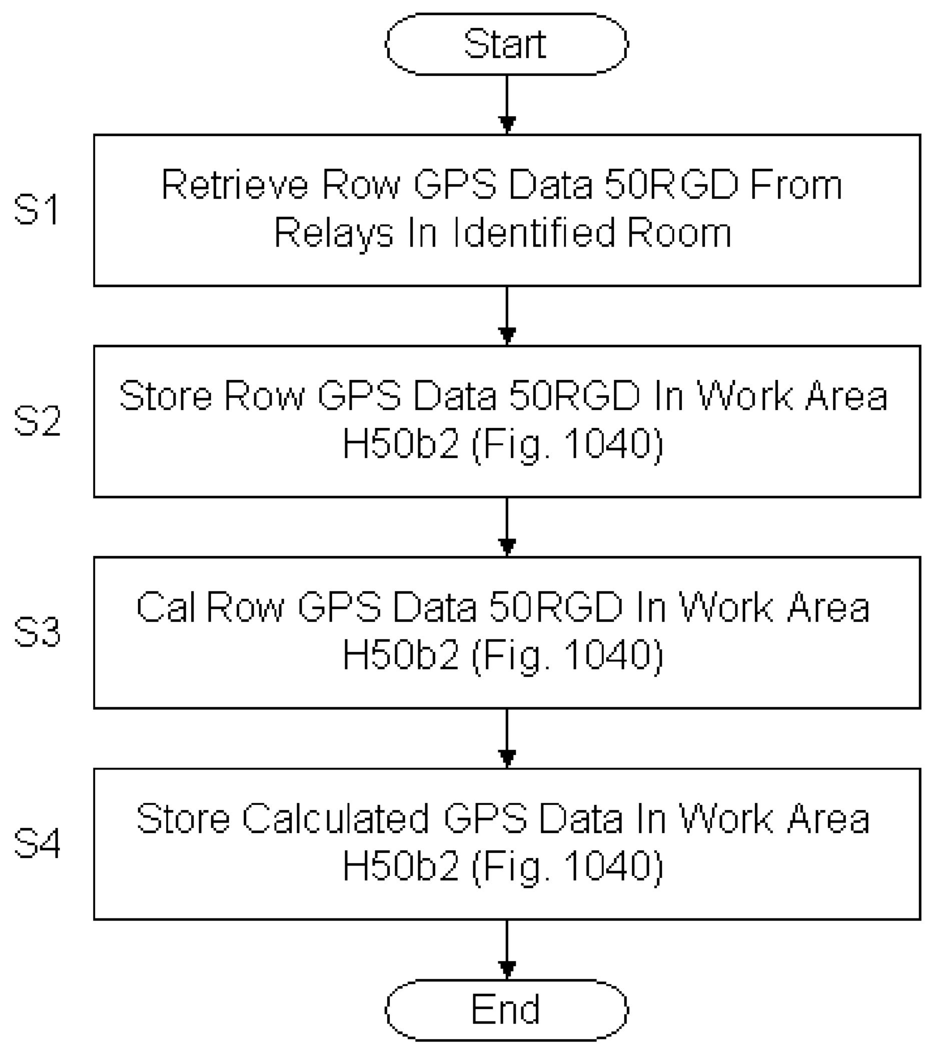

Fig. 1094
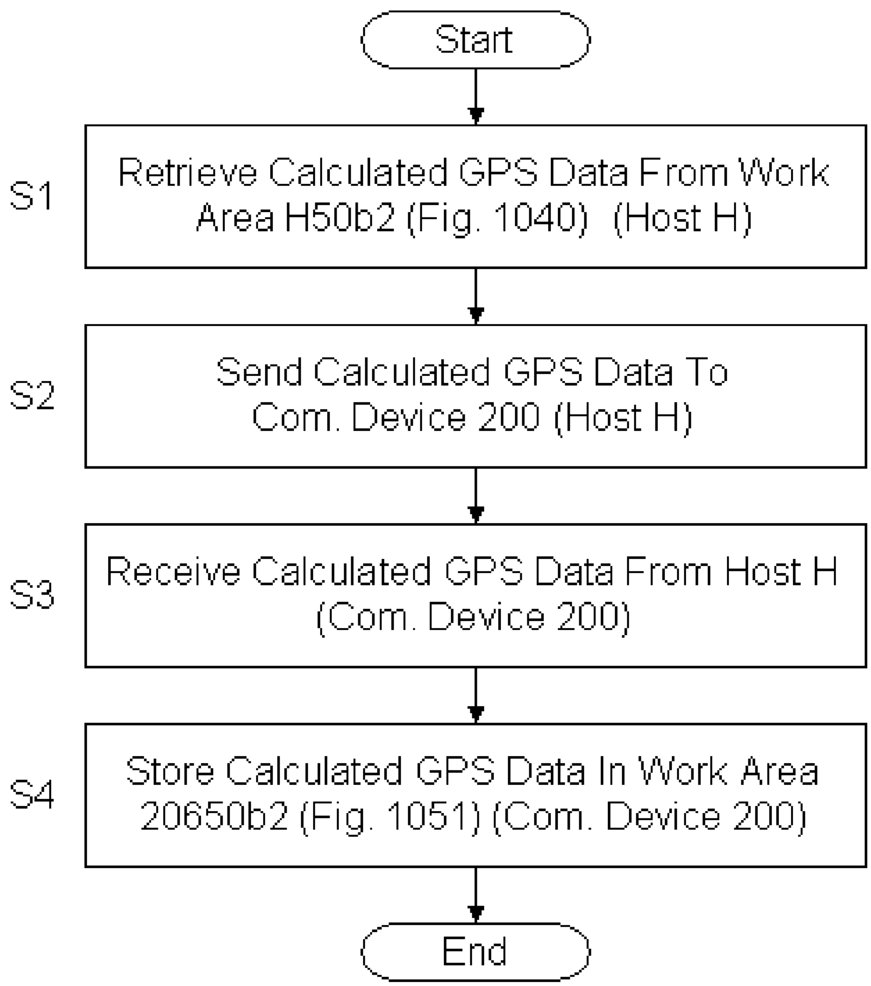

Fig. 1095
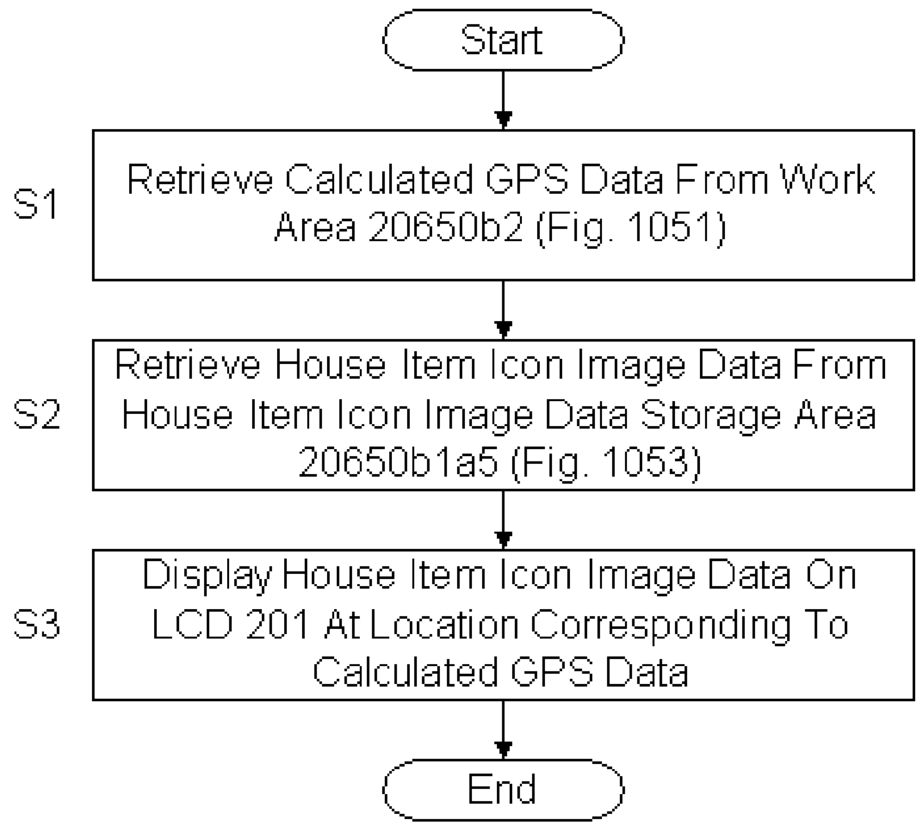

Fig. 1096
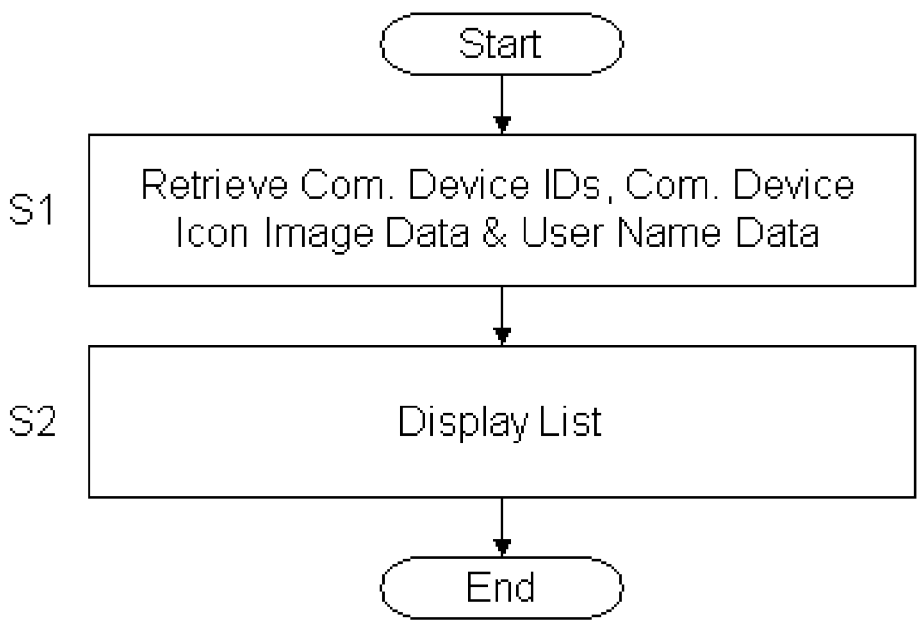

Fig. 1097
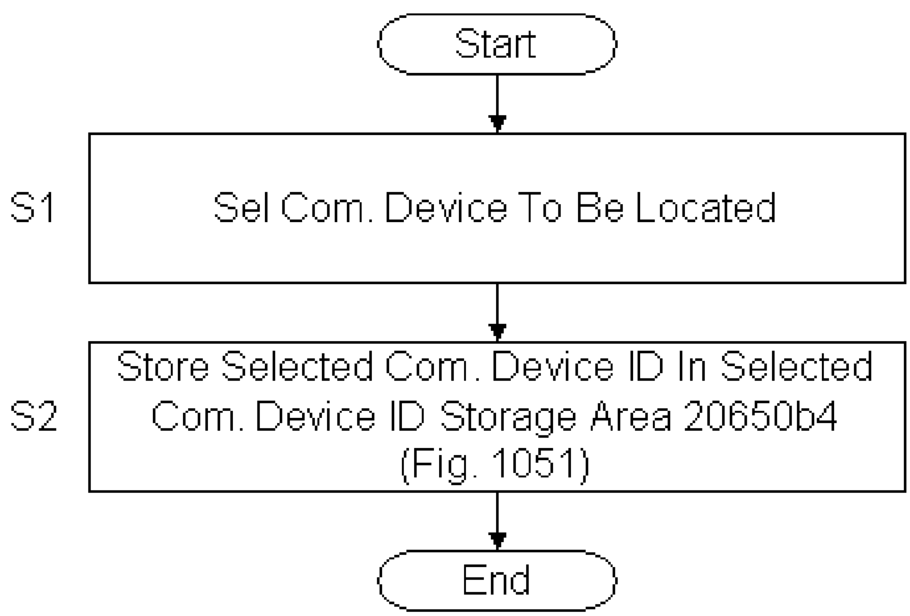

Fig. 1098
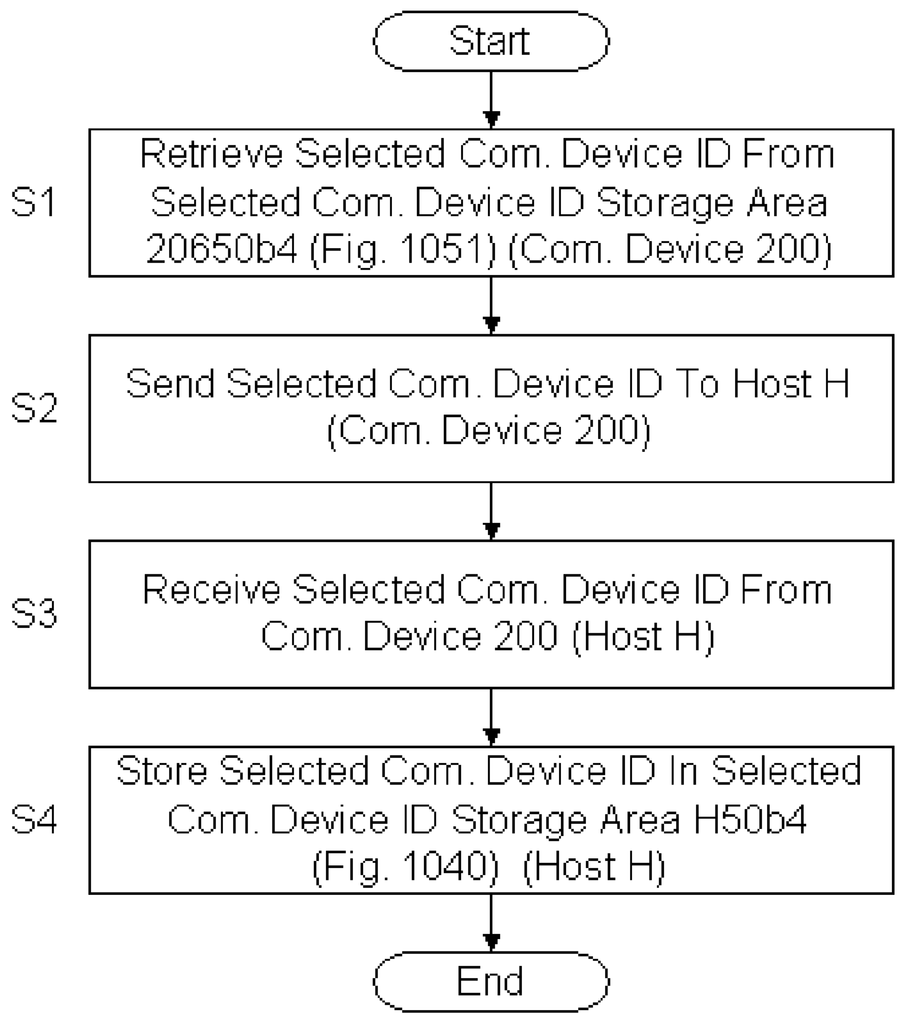

Fig. 1099
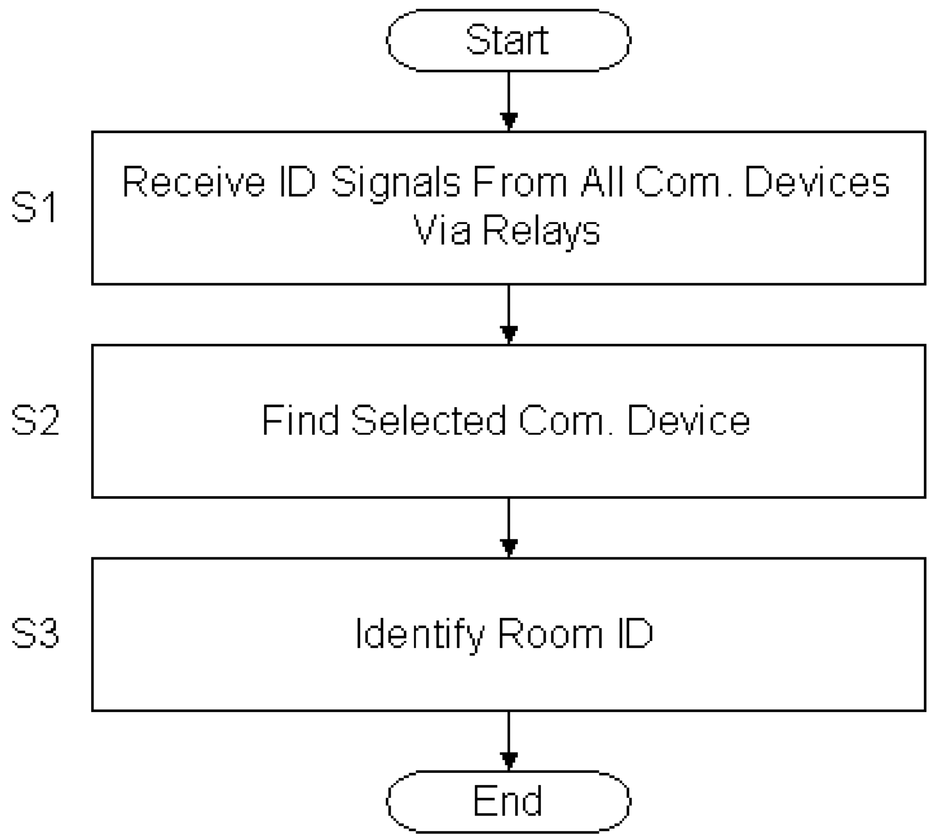

Fig. 1100
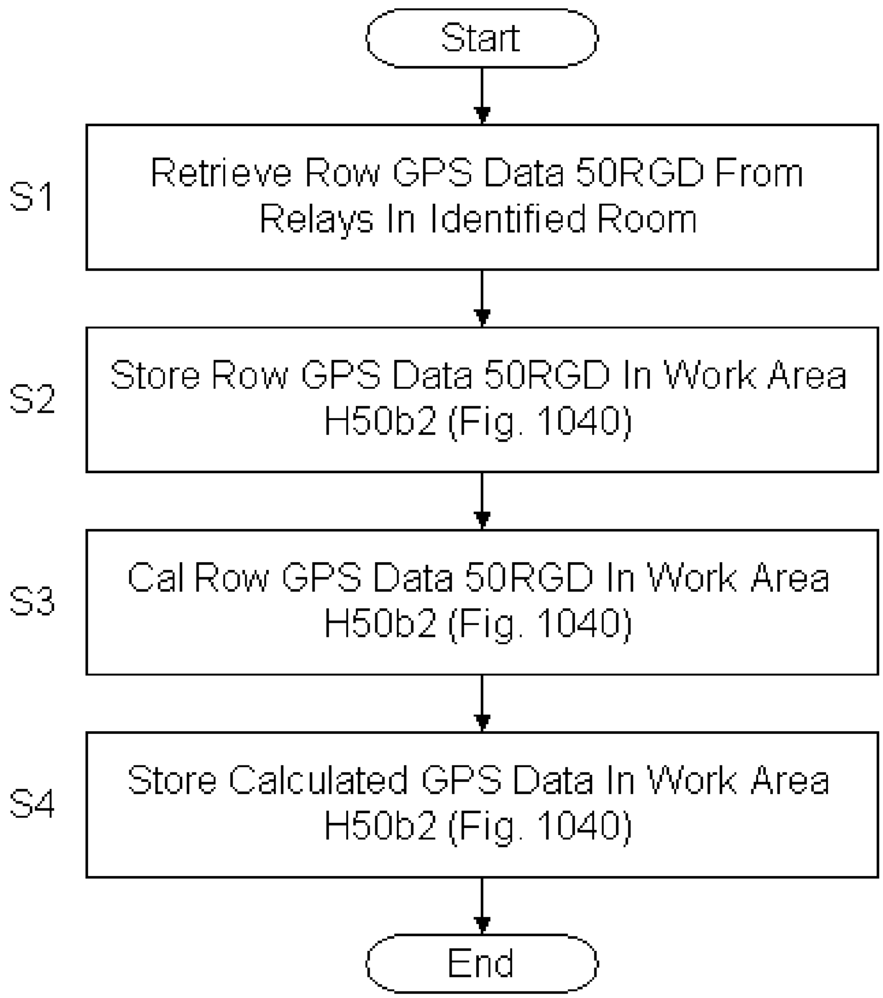

Fig. 1101
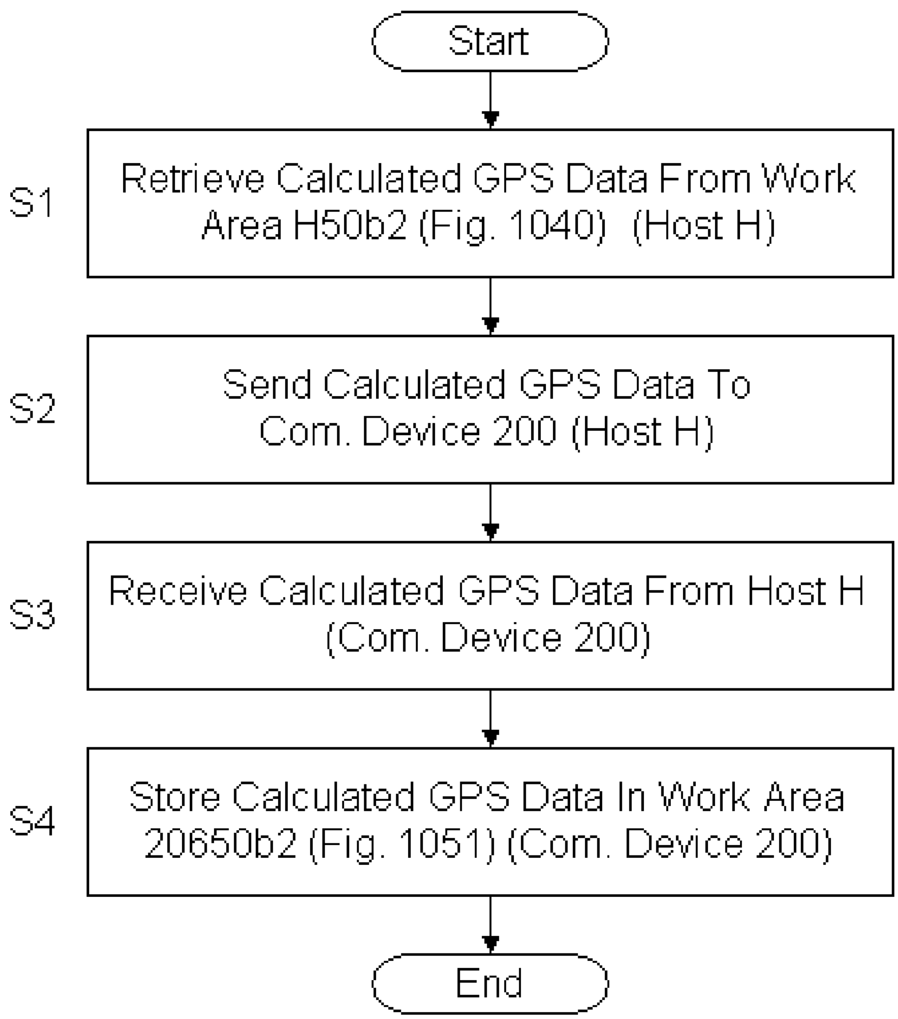

Fig. 1102
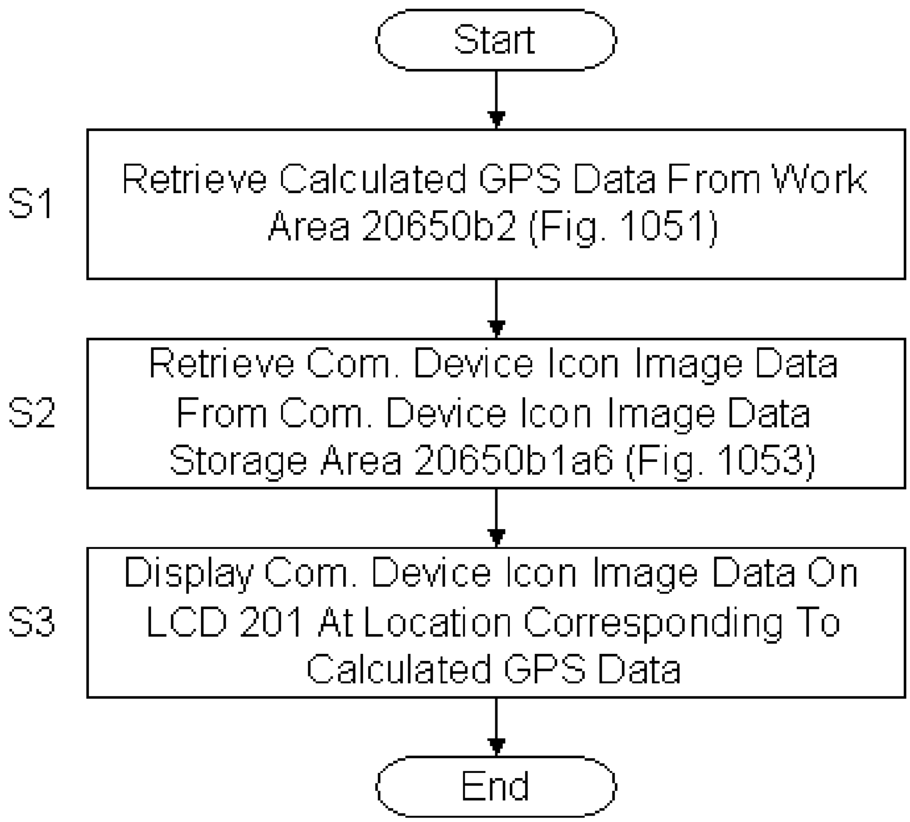

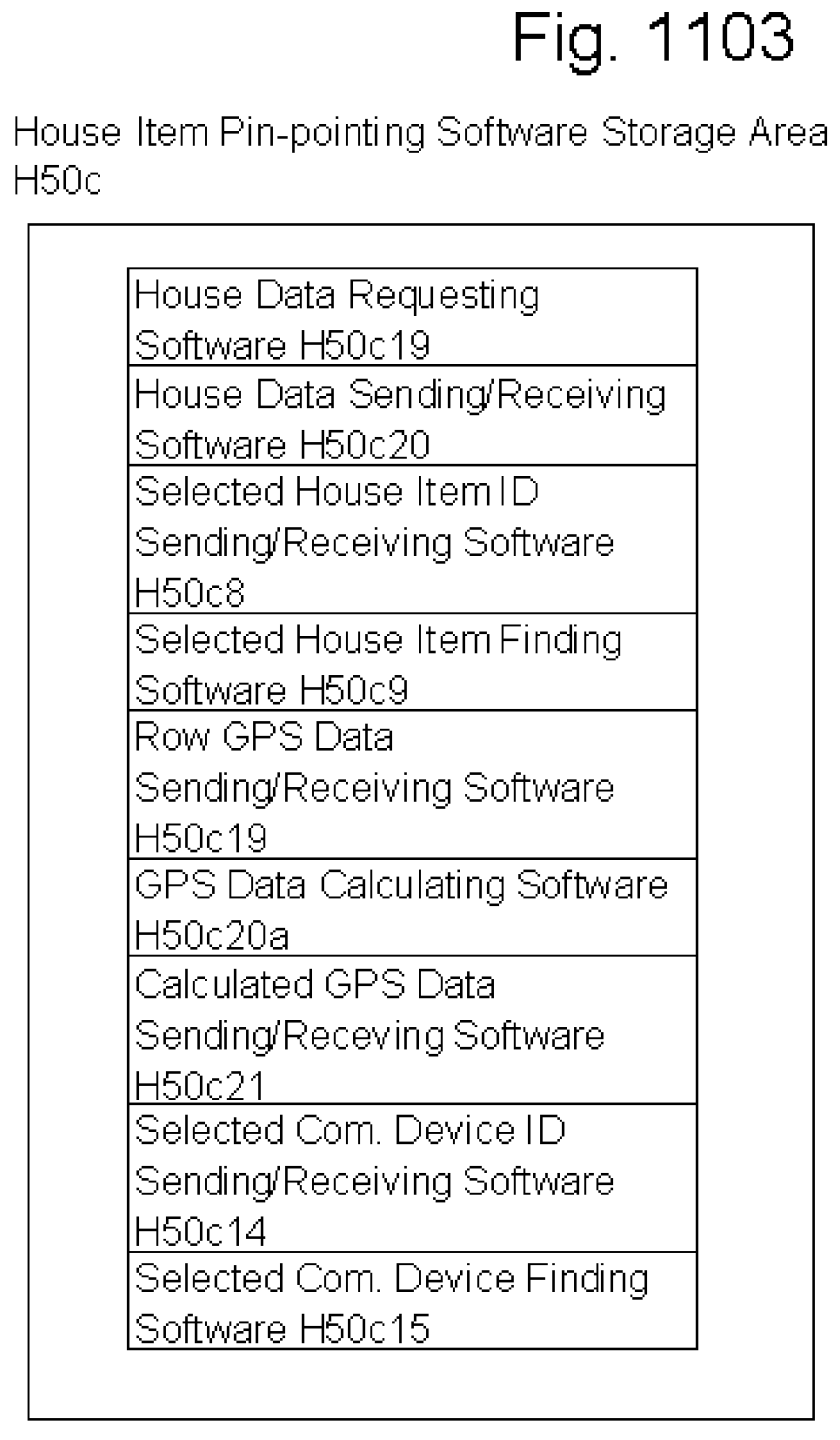

Fig. 1103

House Item Pin-pointing Software Storage Area H50c

| |
|---|
| House Data Requesting Software H50c19 |
| House Data Sending/Receiving Software H50c20 |
| Selected House Item ID Sending/Receiving Software H50c8 |
| Selected House Item Finding Software H50c9 |
| Row GPS Data Sending/Receiving Software H50c19 |
| GPS Data Calculating Software H50c20a |
| Calculated GPS Data Sending/Receving Software H50c21 |
| Selected Com. Device ID Sending/Receiving Software H50c14 |
| Selected Com. Device Finding Software H50c15 |

House Item Pin-pointing Software Storage Area 20650c

Fig. 1104

| |
|---|
| House Data Requesting Software 20650c19 |
| House Data Sending/Receiving Software 20650c20 |
| House Layout Data Displaying Software 20650c3 |
| Room Layout Data Displaying Software 20650c6 |
| House Item List Displaying Software 20650c6a |
| House Item Selecting Software 20650c7 |
| Selected House Item ID Sending/Receiving Software 20650c8 |
| Calculated GPS Data Sending/Receving Software 20650c21 |
| Selected House Item Displaying Software 20650c12 |
| Com. Device List Displaying Software 20650c12a |
| Com. Device Selecting Software 20650c13 |
| Selected Com. Device ID Sending/Receiving Software 20650c14 |
| Row GPS Data Sending/Receiving Software 20650c19 |
| Selected Com. Device Displaying Software 20650c18 |

Fig. 1105
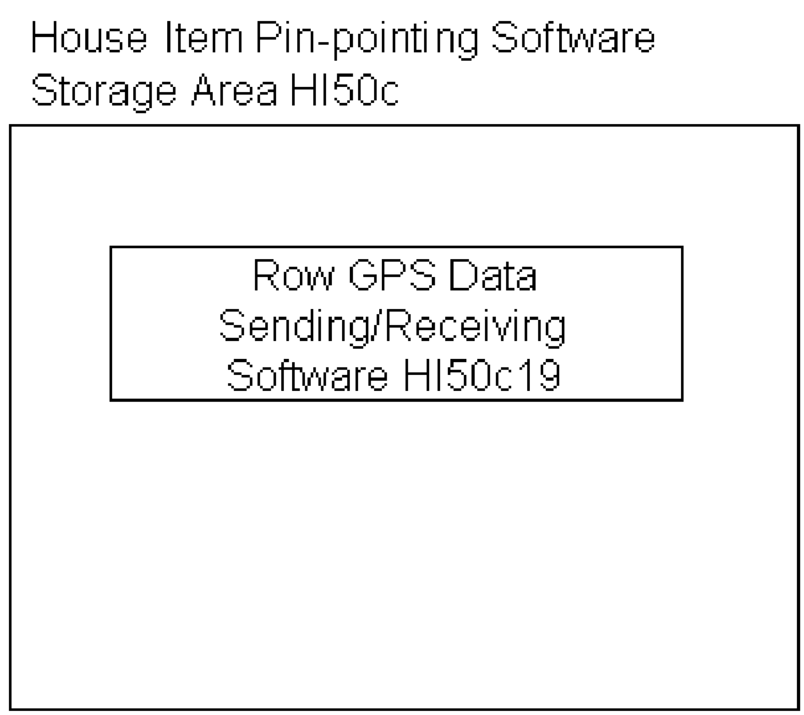

Fig. 1106
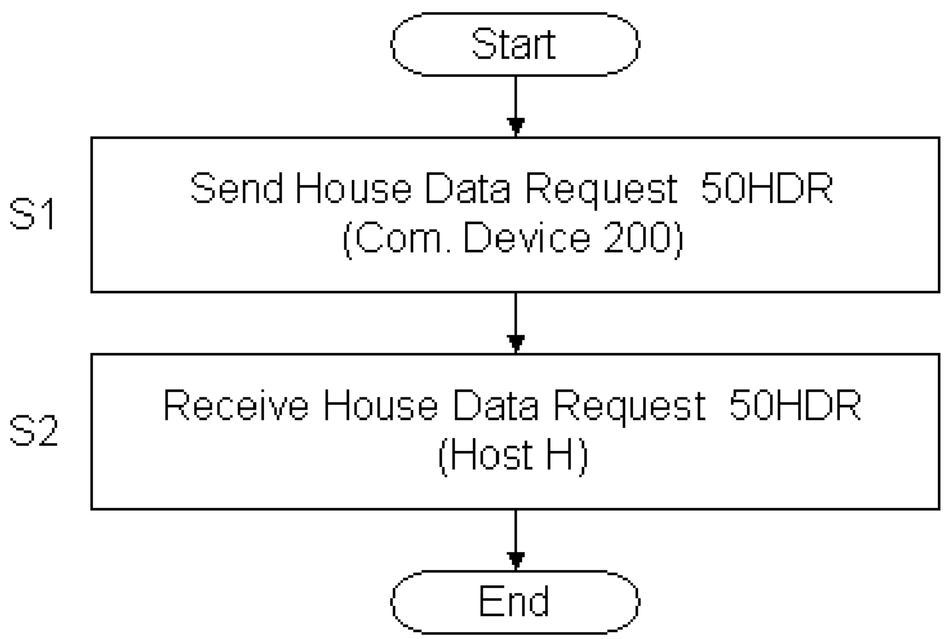

Fig. 1107
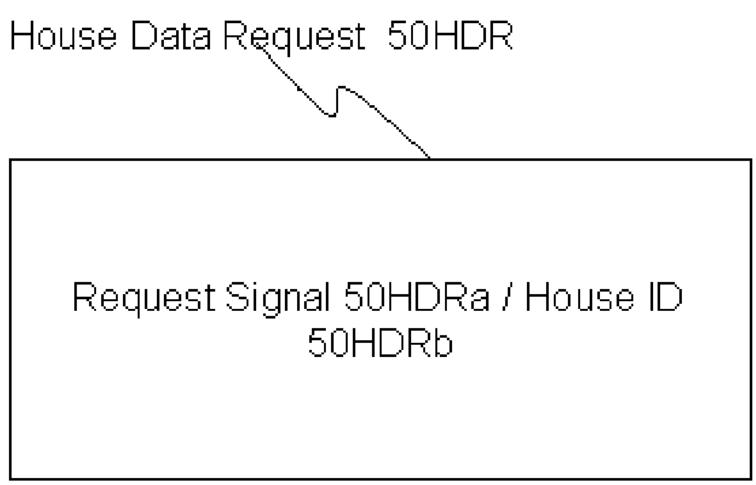

Fig. 1108
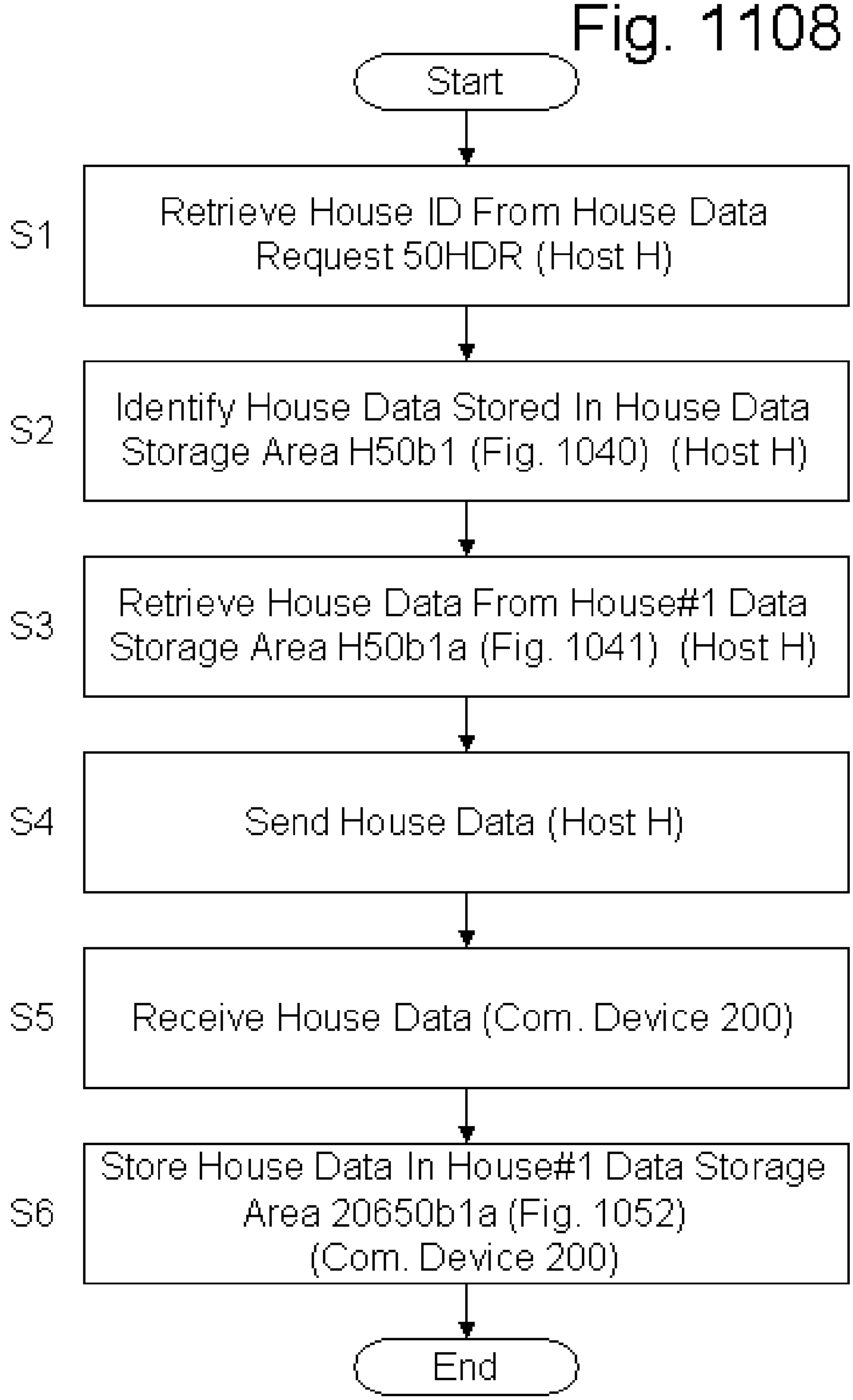

Fig. 1109
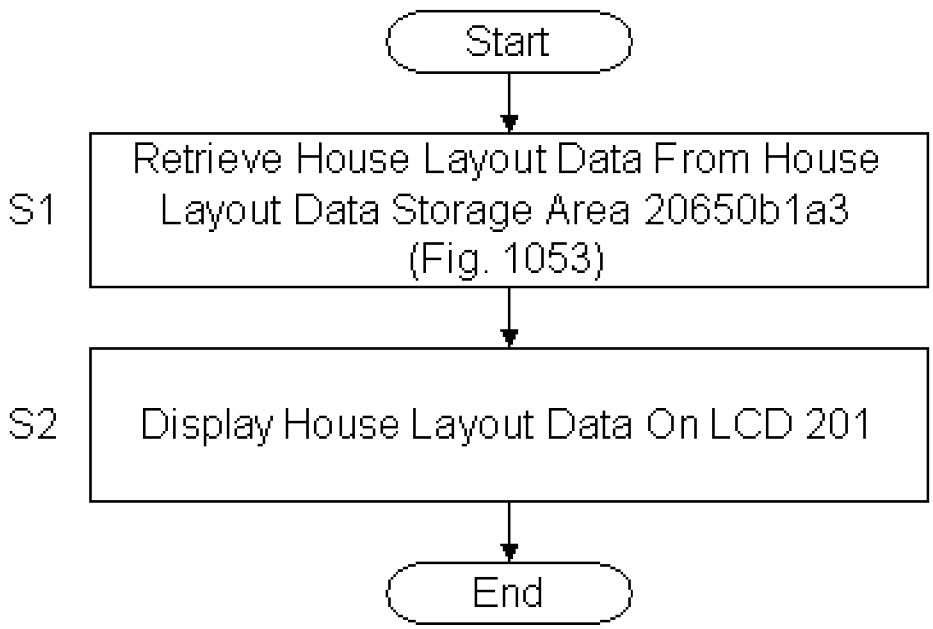

Fig. 1110
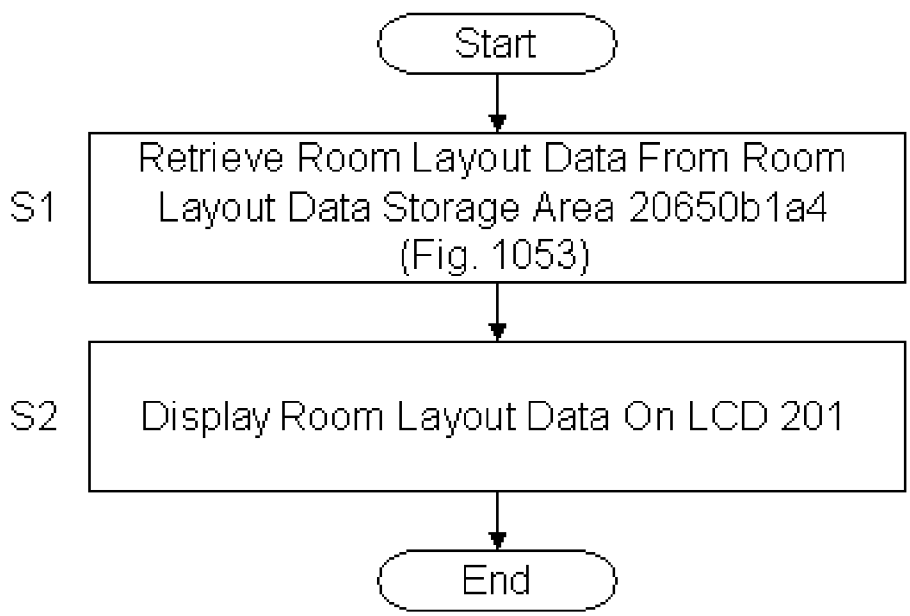

Fig. 1111
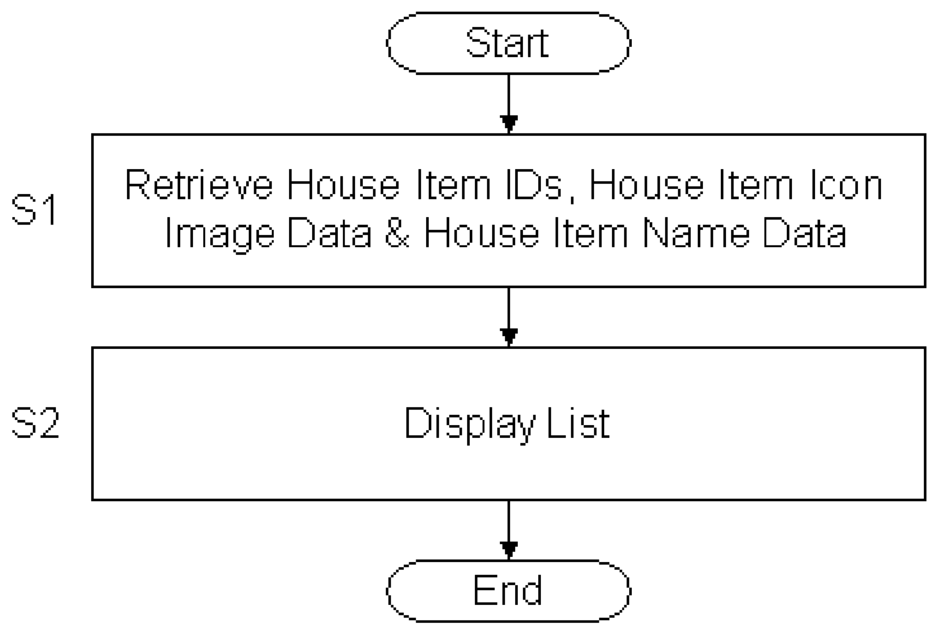

Fig. 1112
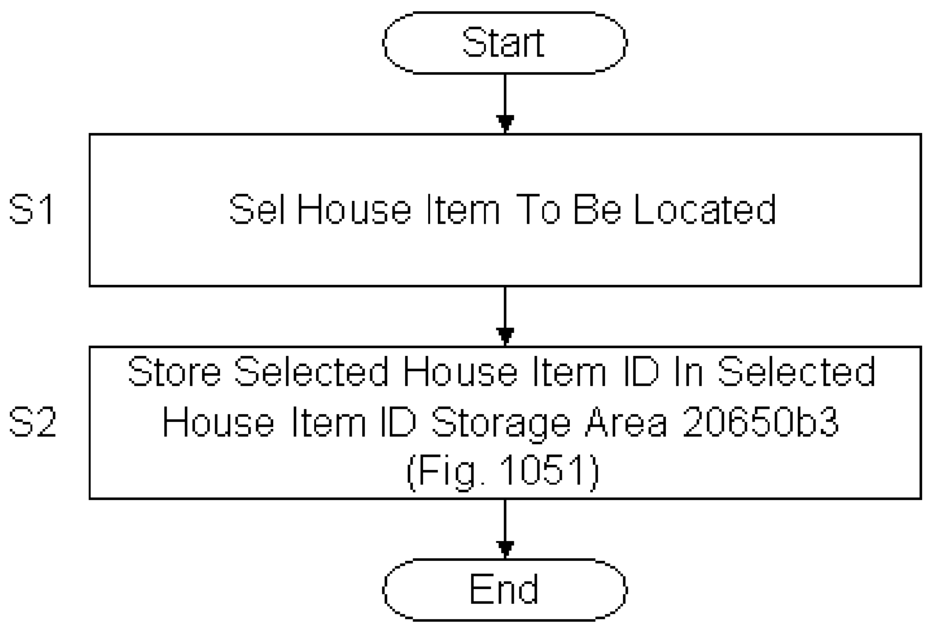

Fig. 1113
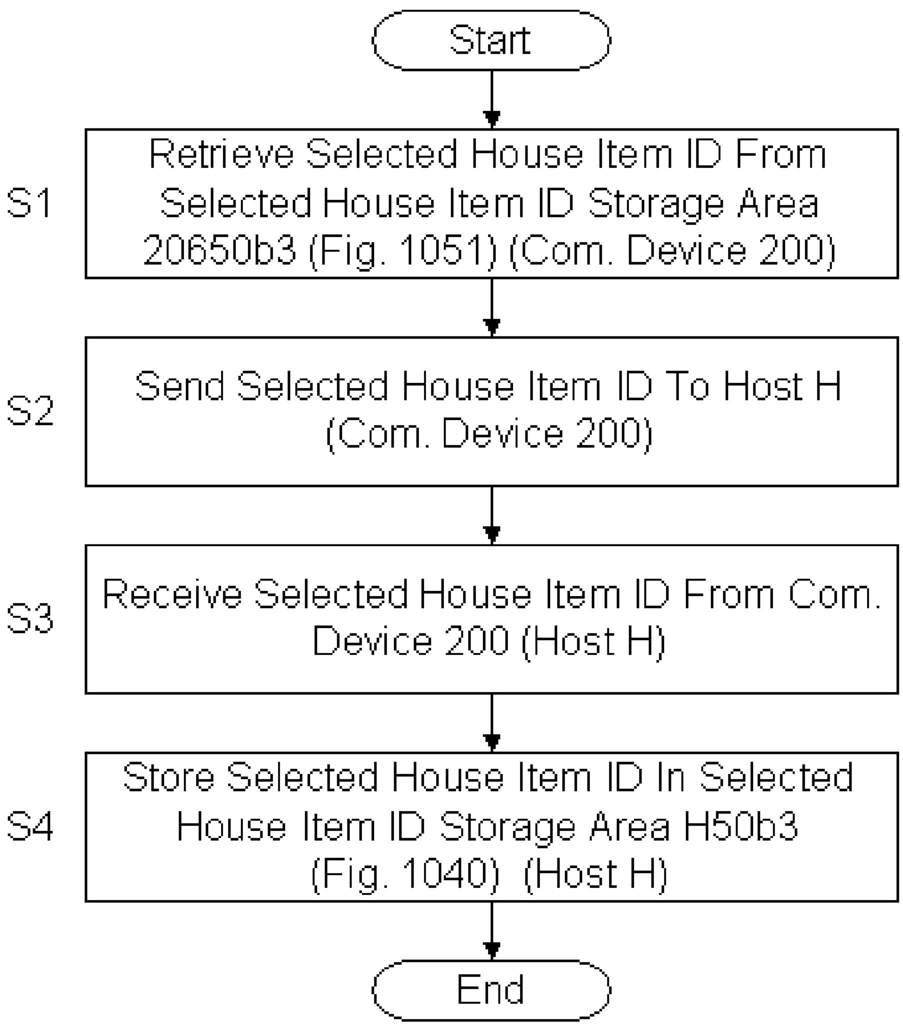

Fig. 1114
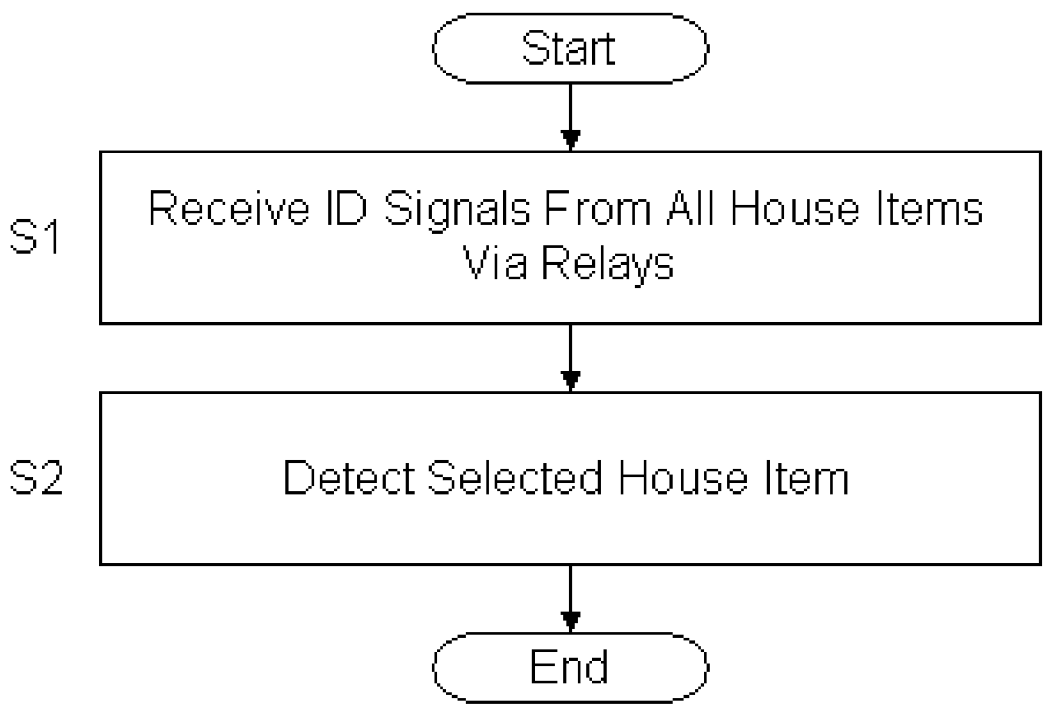

Fig. 1115
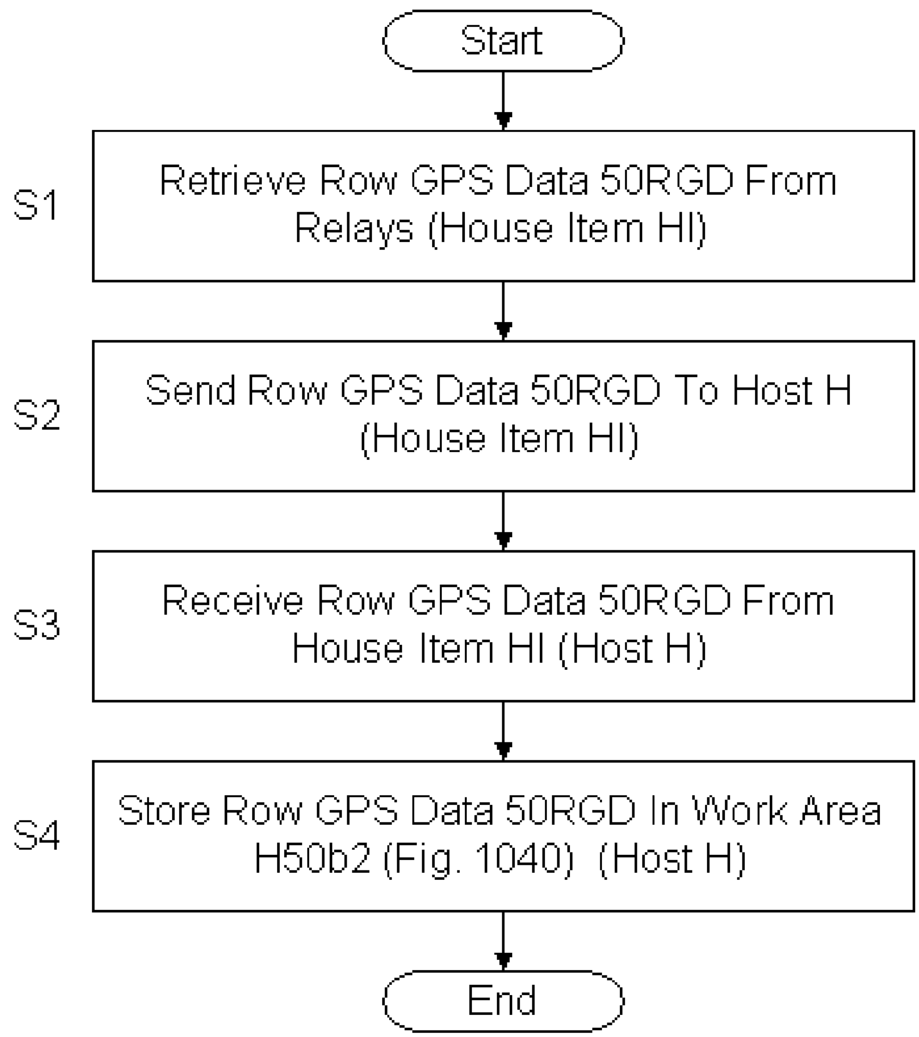

Fig. 1116
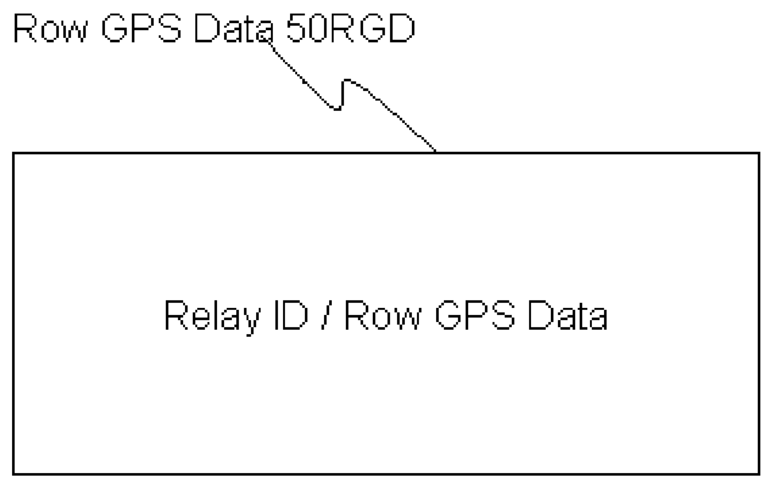

Fig. 1117
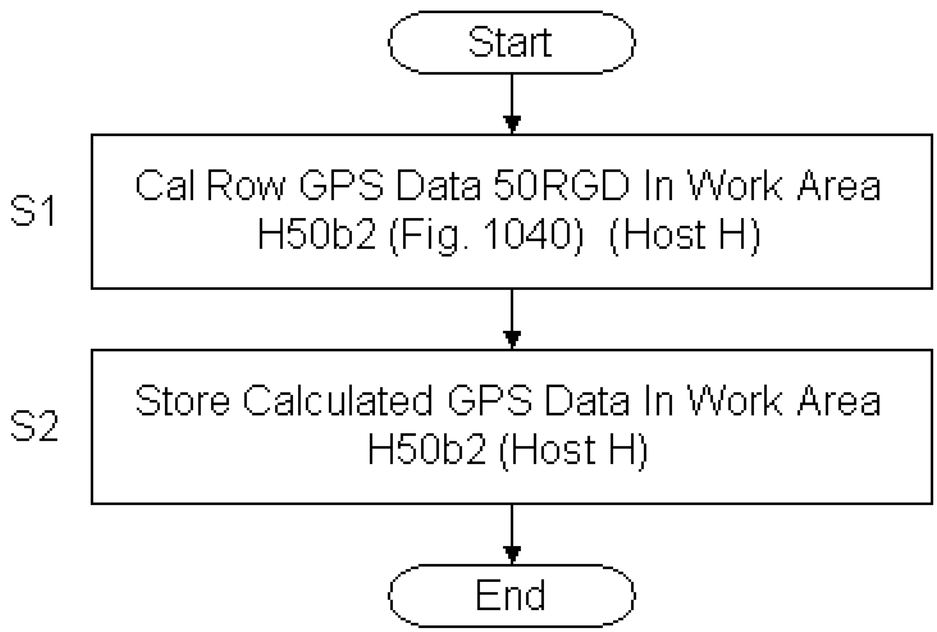

Fig. 1118
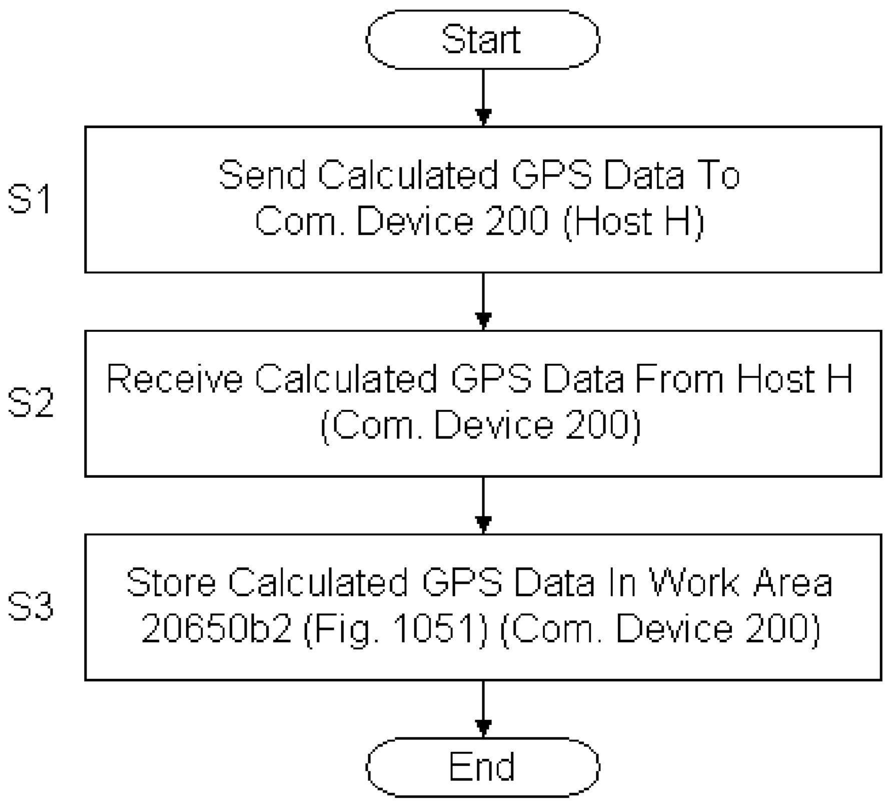

Fig. 1119
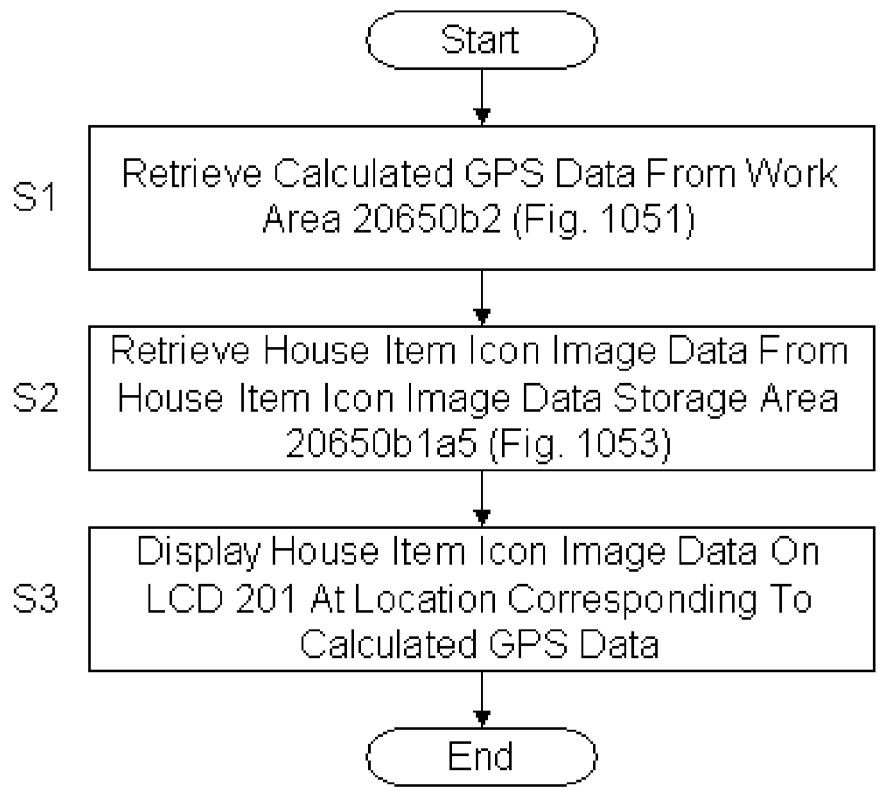

Fig. 1120
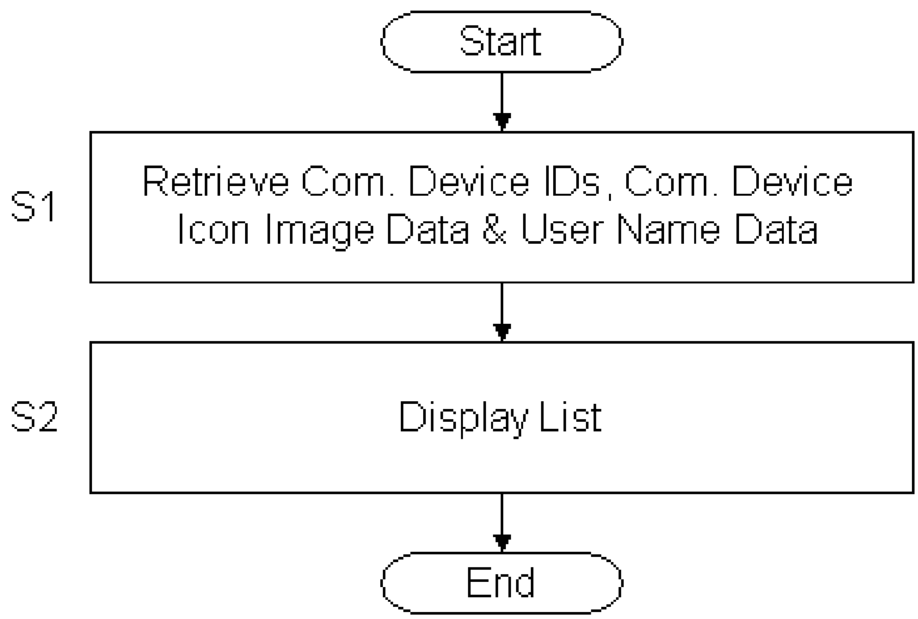

Fig. 1121
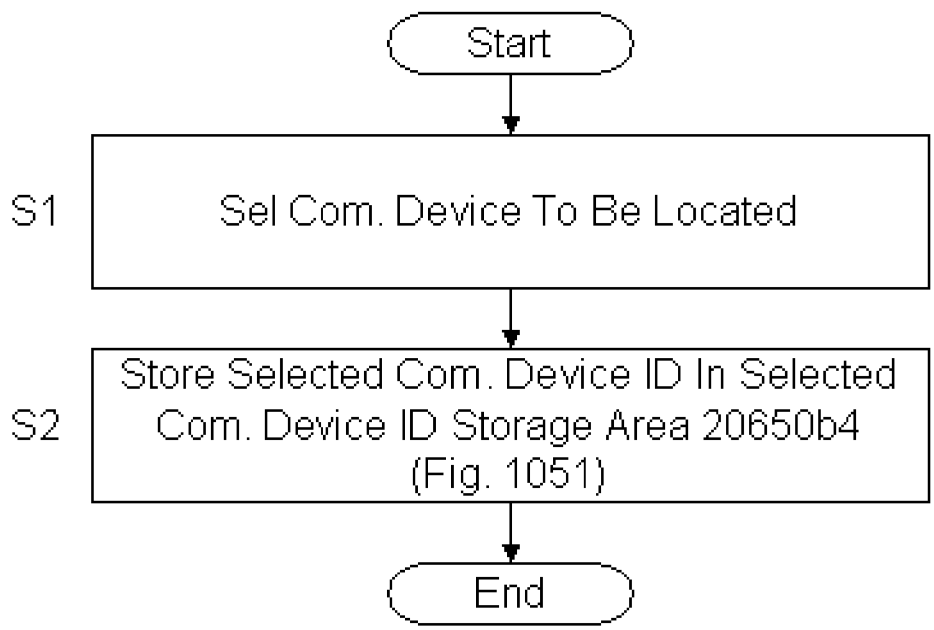

Fig. 1122
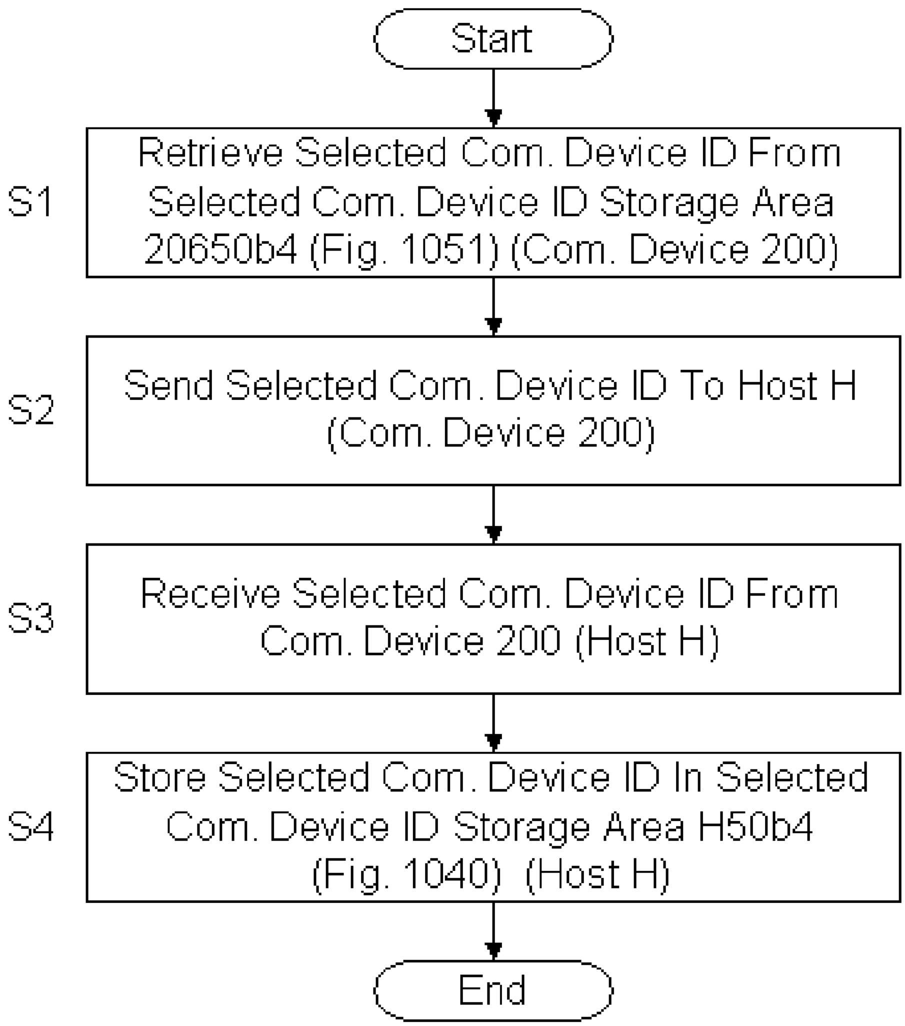

Fig. 1123
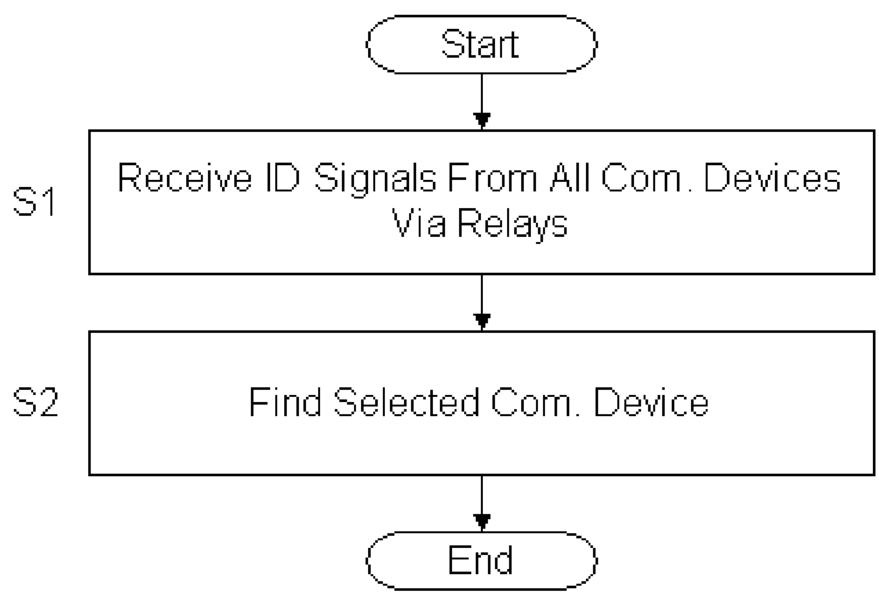

Fig. 1124
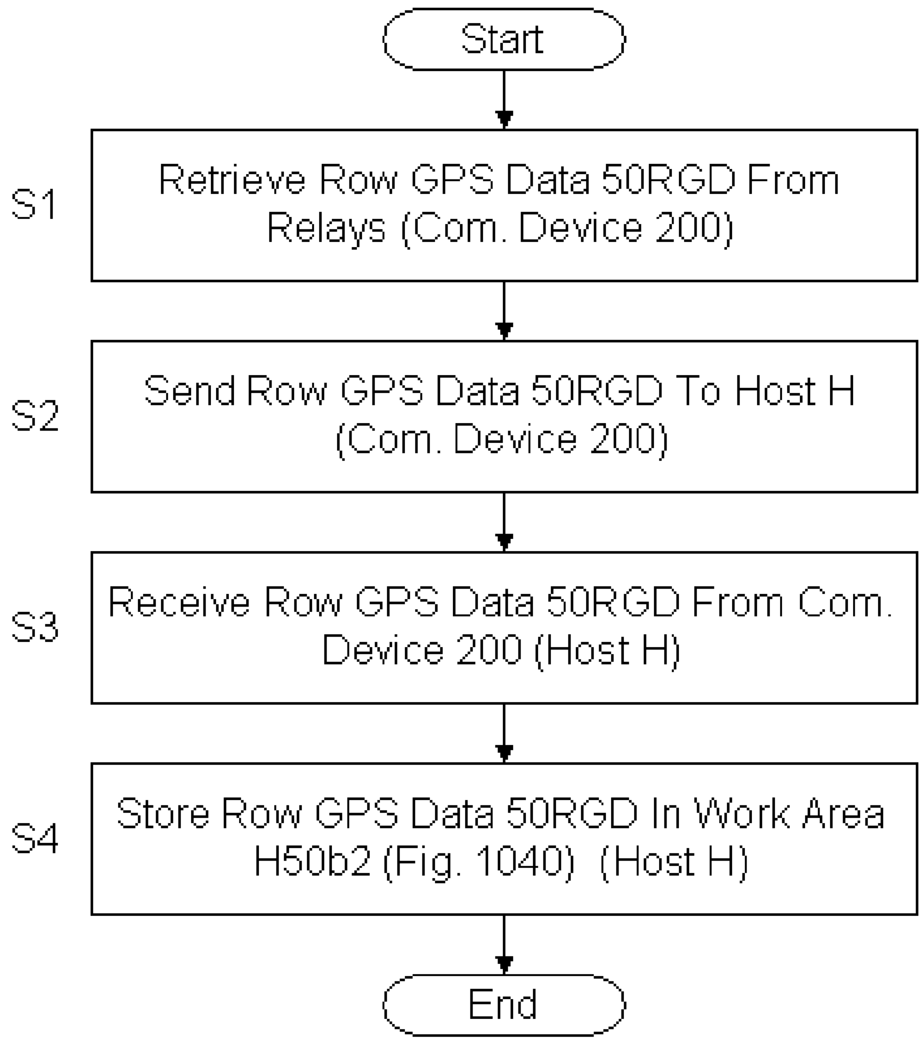

Fig. 1125
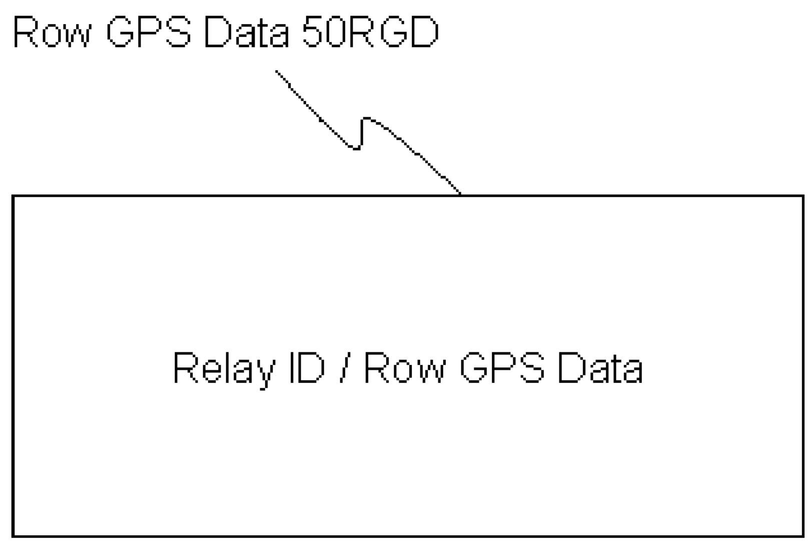

Fig. 1126
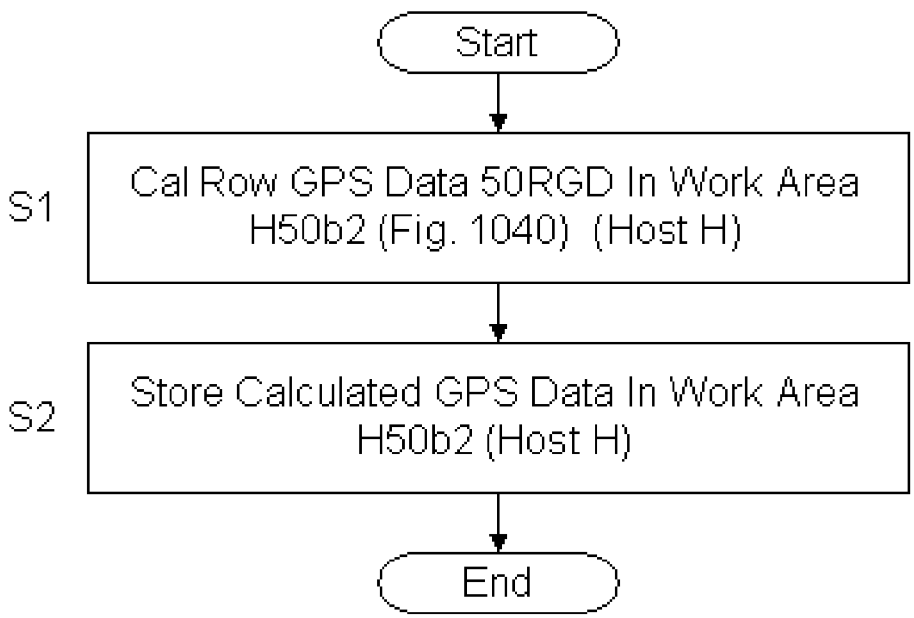

Fig. 1127
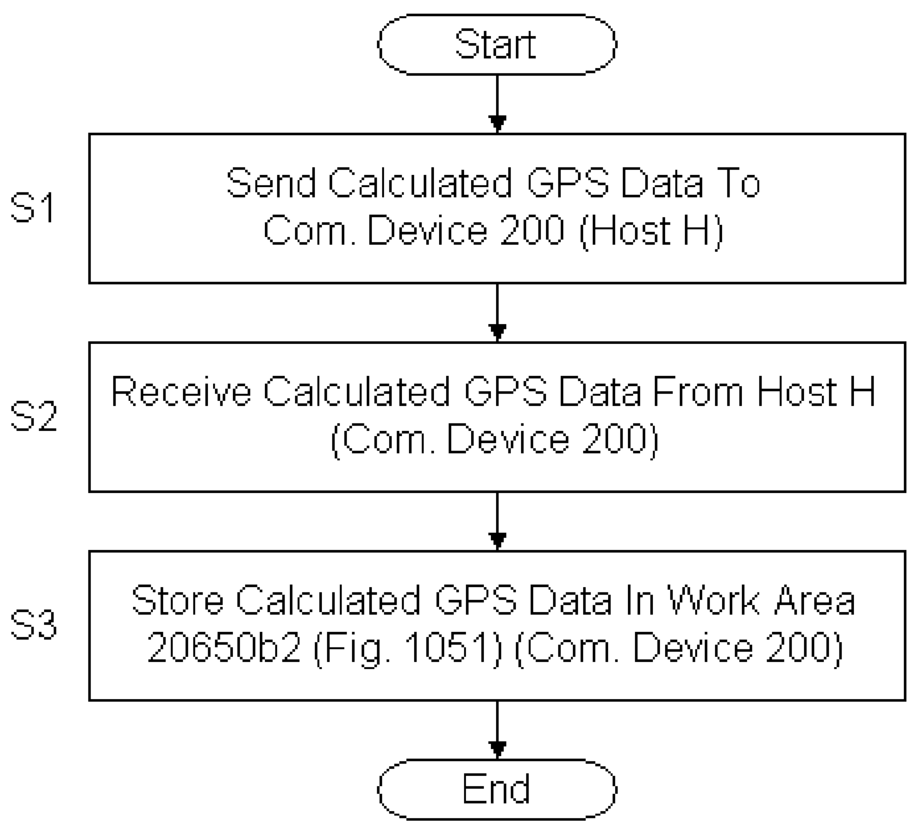

Fig. 1128
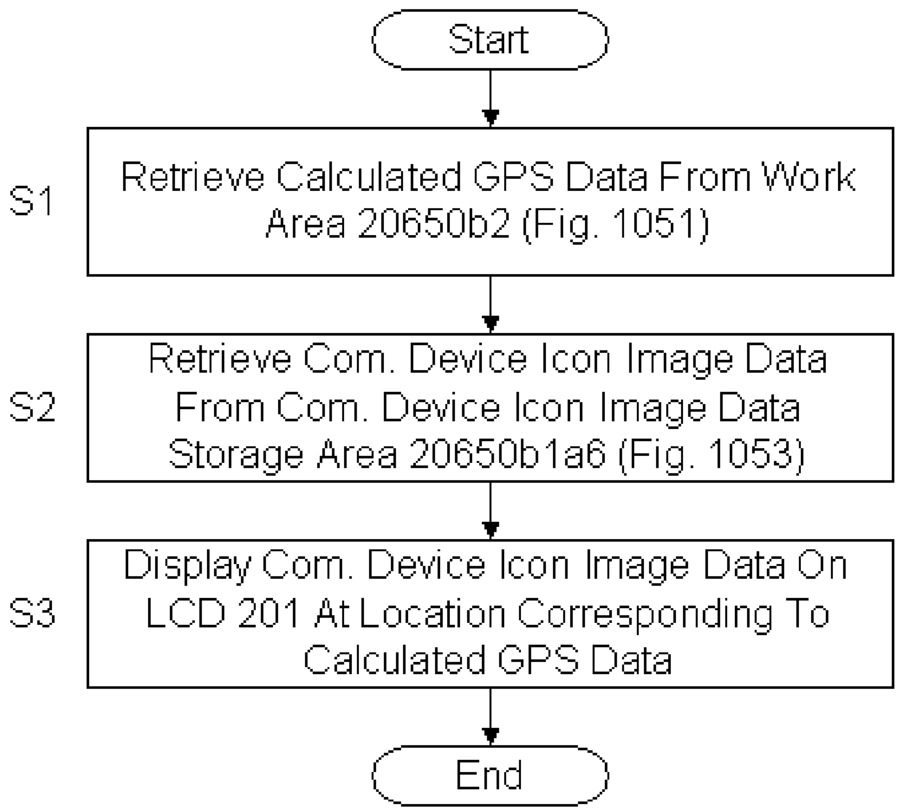

Fig. 1129
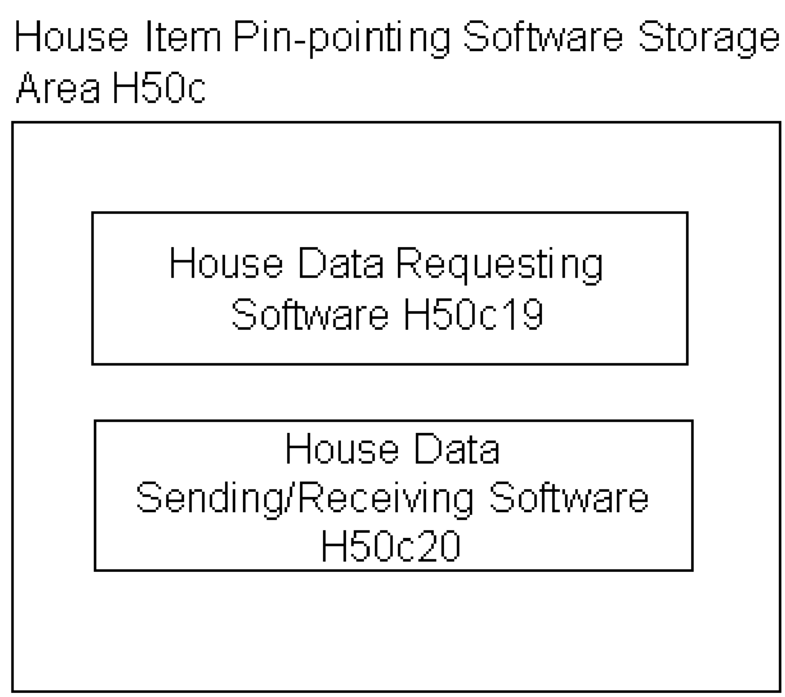

Fig. 1130

House Item Pin-pointing Software Storage Area 20650c (Device A)

| |
|---|
| House Data Requesting Software 20650c19 |
| House Data Sending/Receiving Software 20650c20 |
| House Layout Data Displaying Software 20650c3 |
| Room Layout Data Displaying Software 20650c6 |
| House Item List Displaying Software 20650c6a |
| House Item Selecting Software 20650c7 |
| Selected House Item Finding Software 20650c21 |
| Row GPS Data Sending/Receiving Software 20650c19 |
| GPS Data Calculating Software 20650c20 |
| Selected House Item Displaying Software 20650c12 |
| Com. Device List Displaying Software 20650c12a |
| Com. Device Selecting Software 20650c13 |
| Selected Com. Device Finding Software H50c15 |
| Selected Com. Device Displaying Software 20650c18 |

Fig. 1131
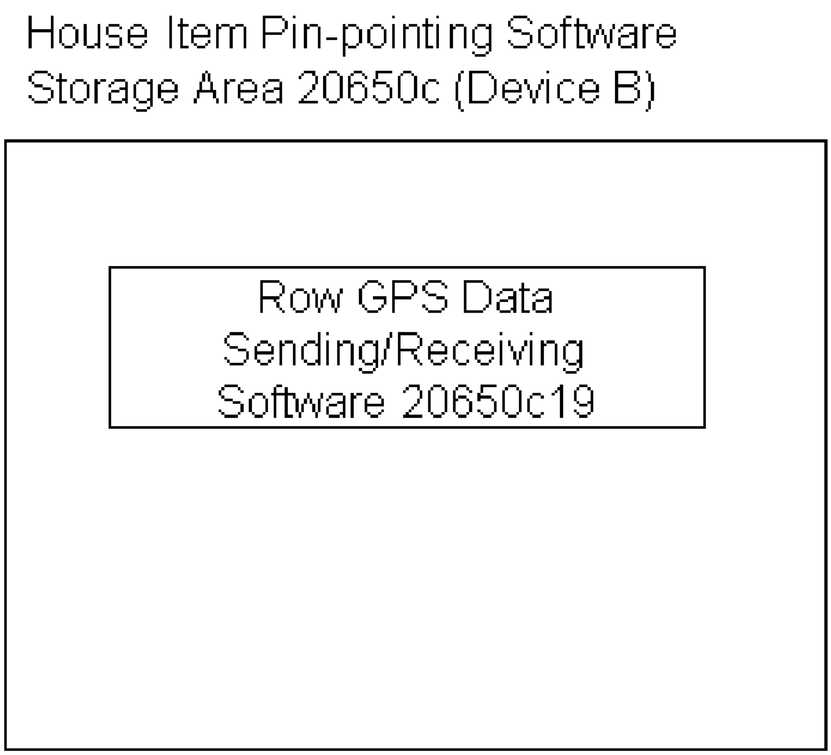

Fig. 1131a
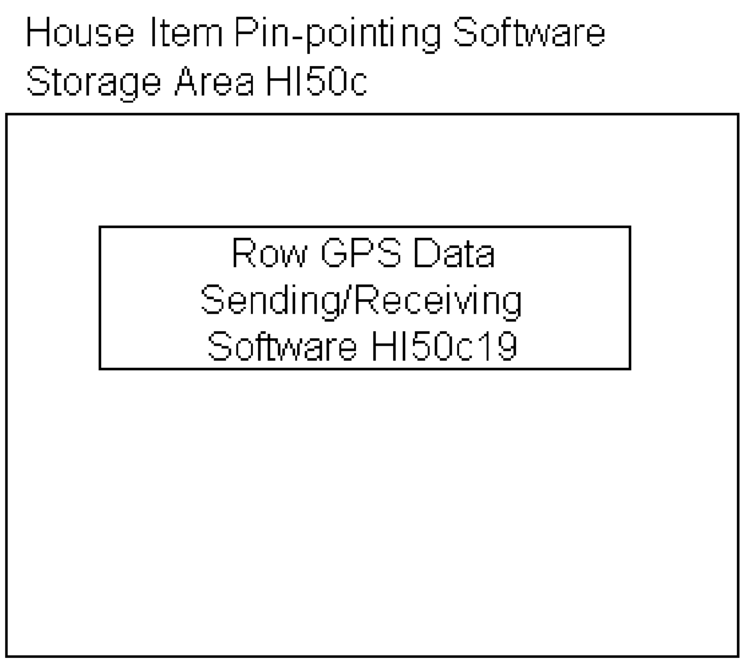

Fig. 1132
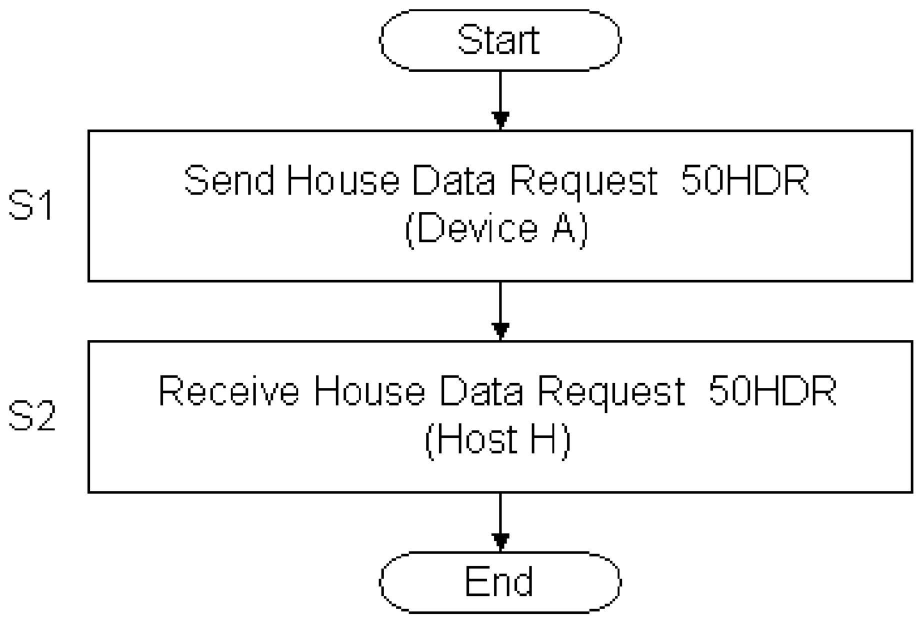

Fig. 1133
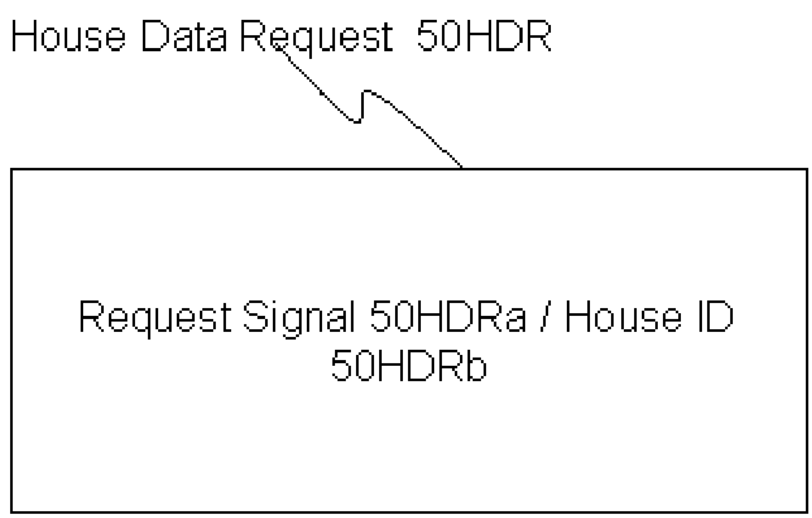

Fig. 1134
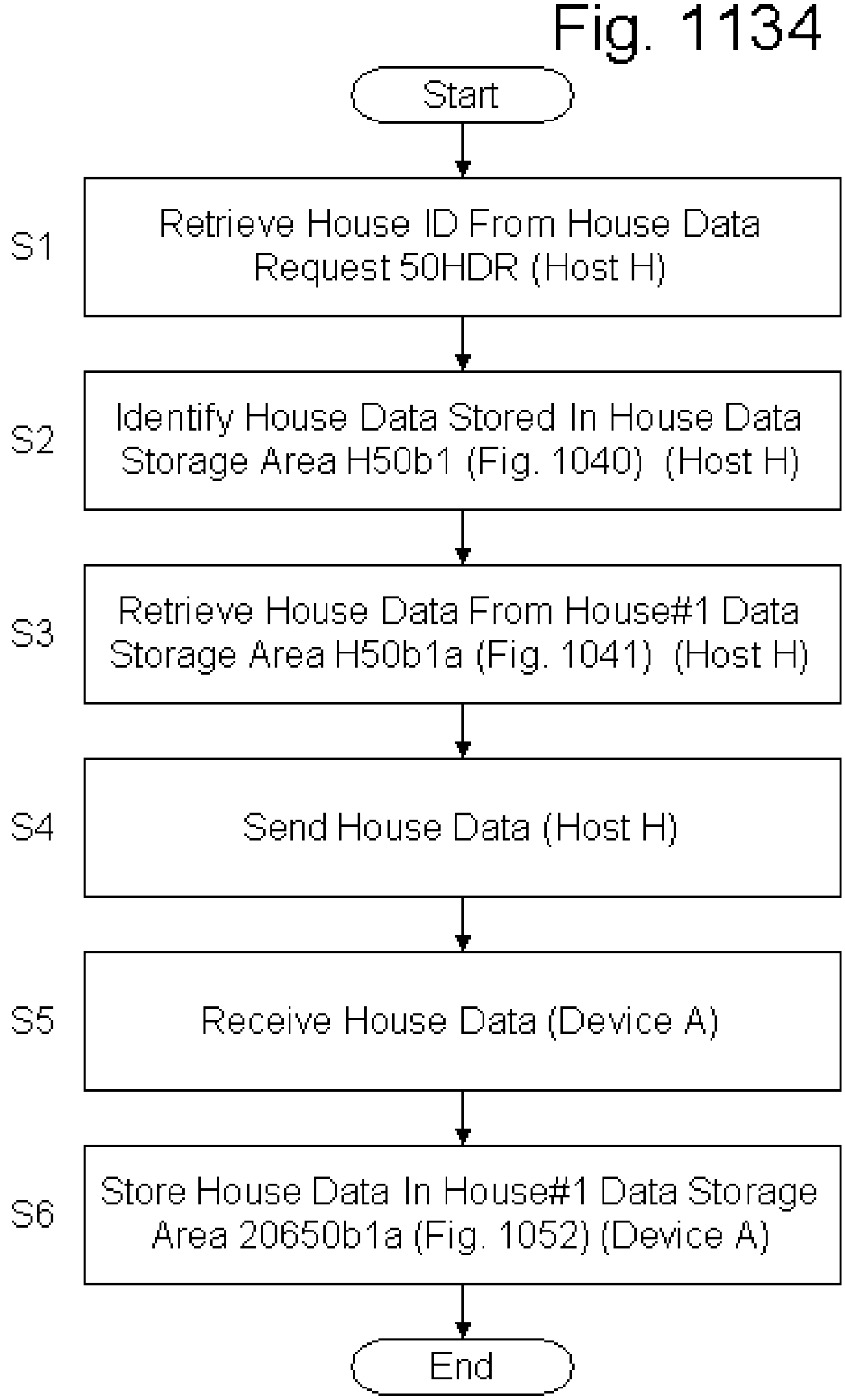

Fig. 1135
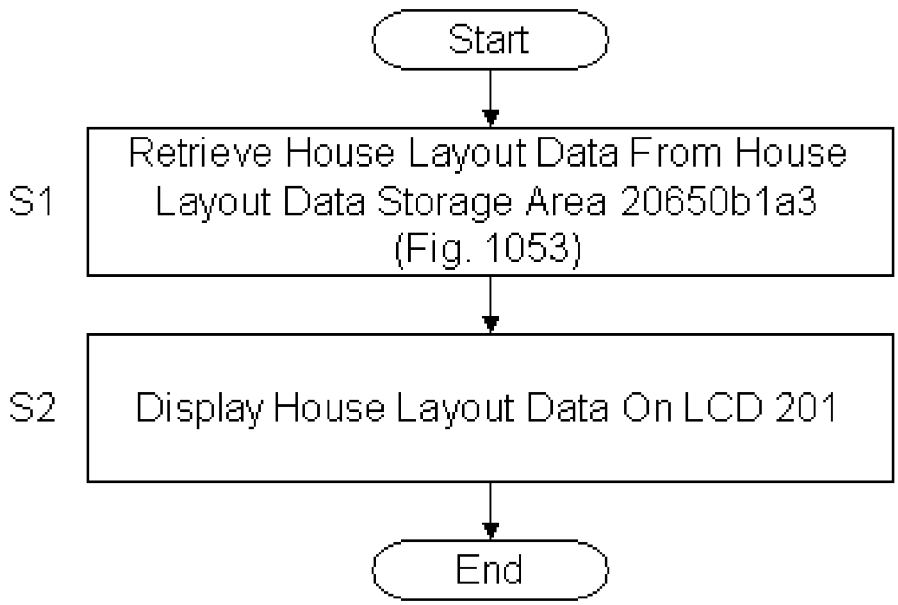

Fig. 1136
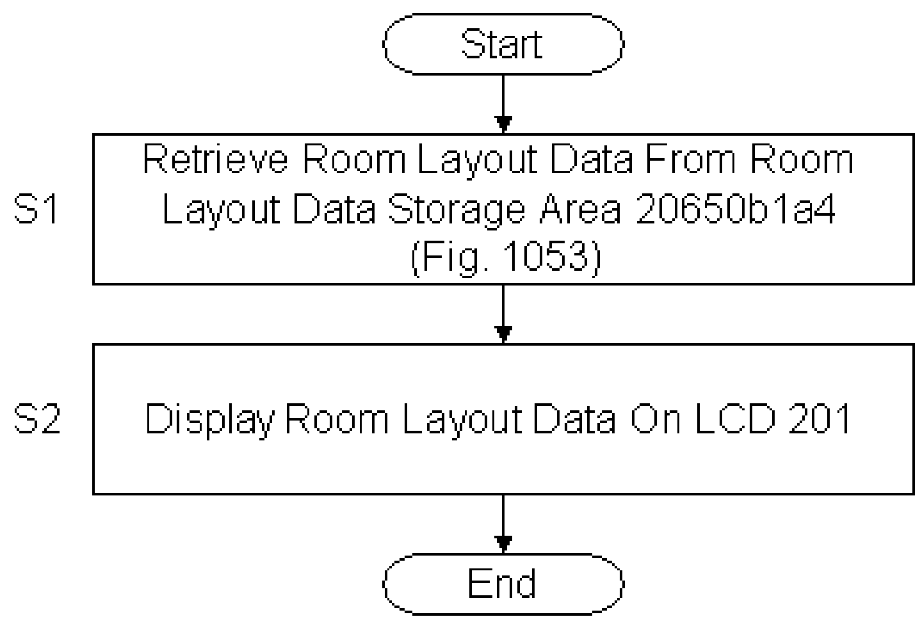

Fig. 1137
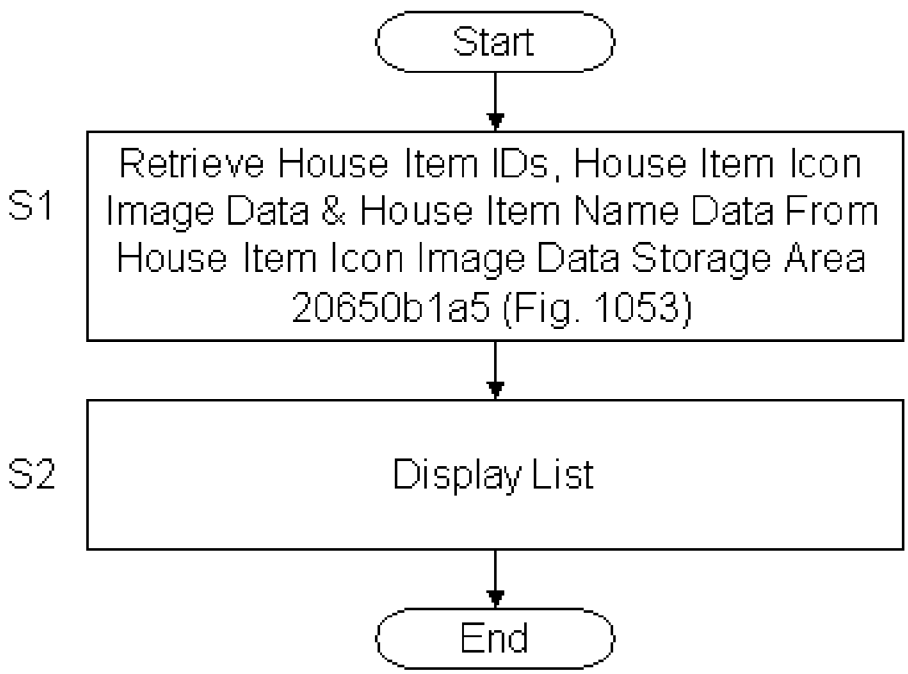

Fig. 1138
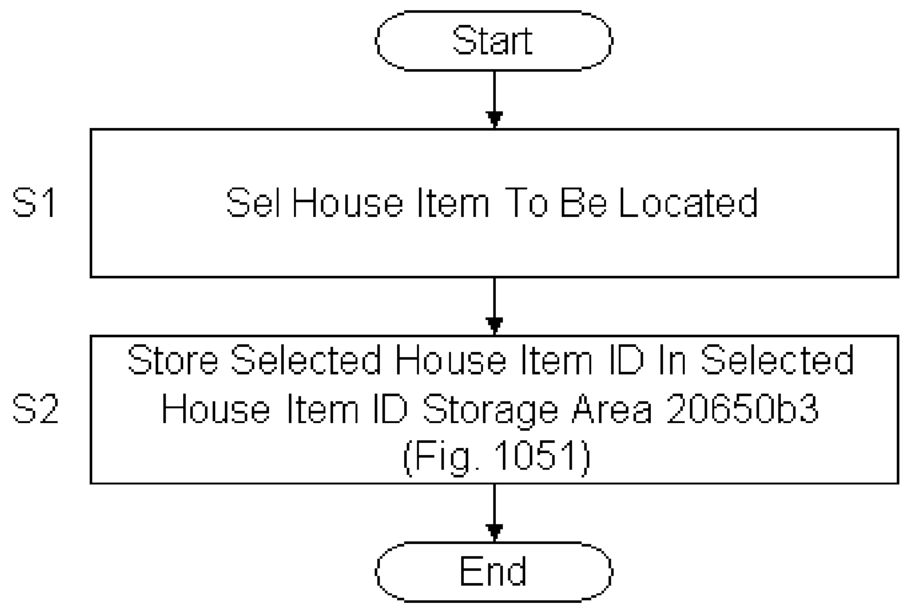

Fig. 1139
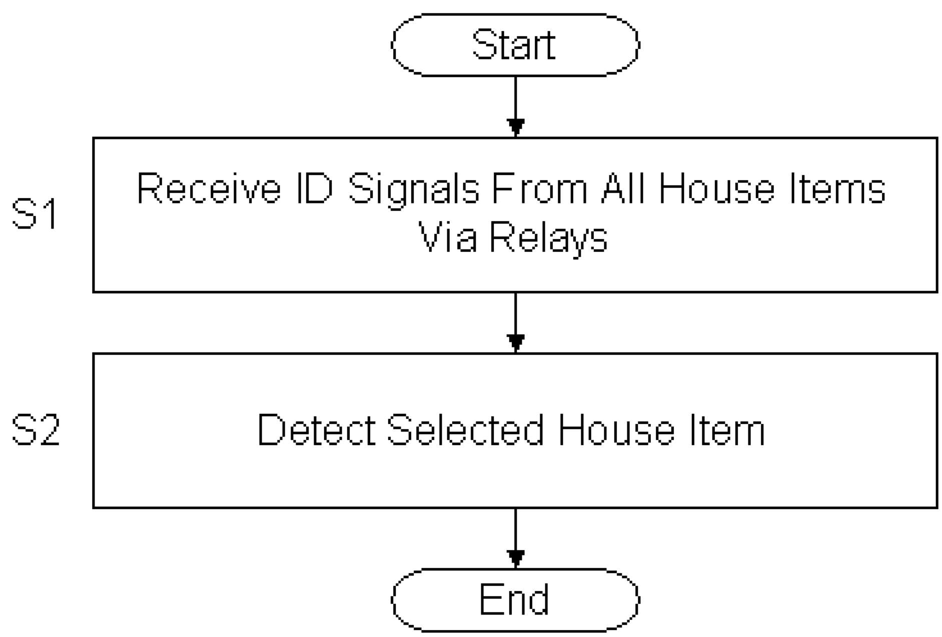

Fig. 1140
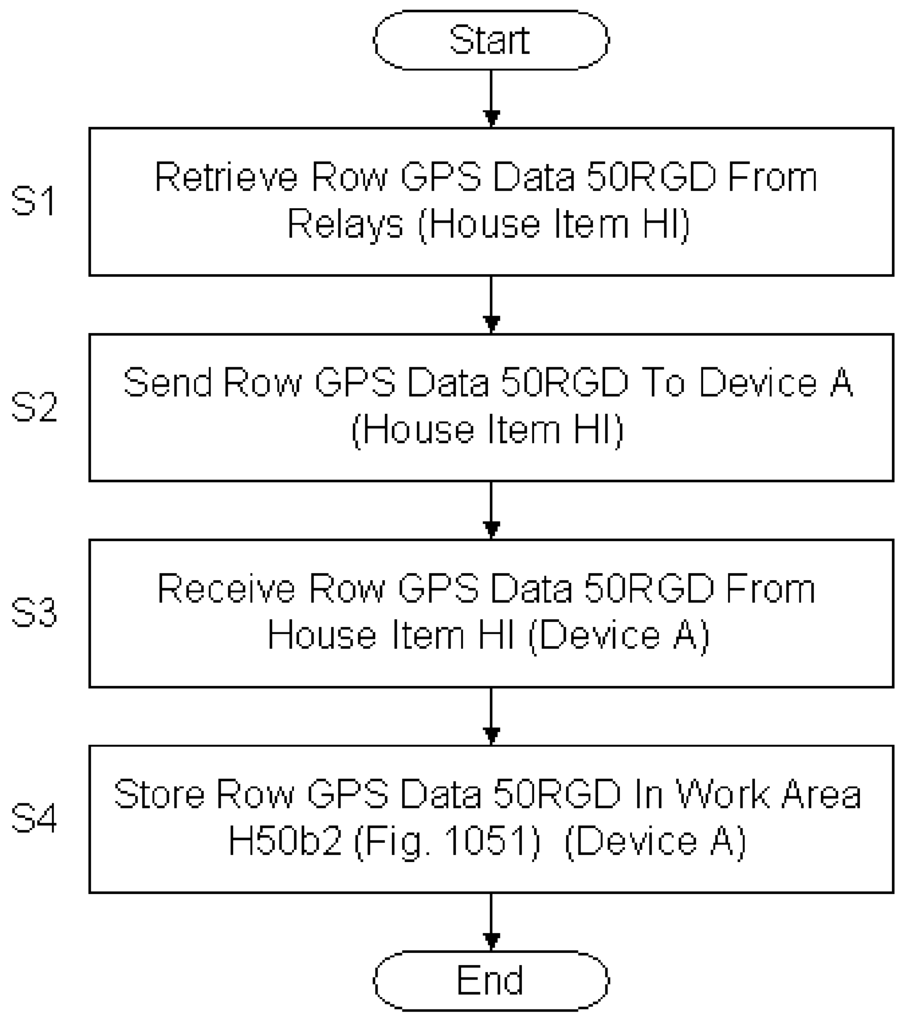

Fig. 1141
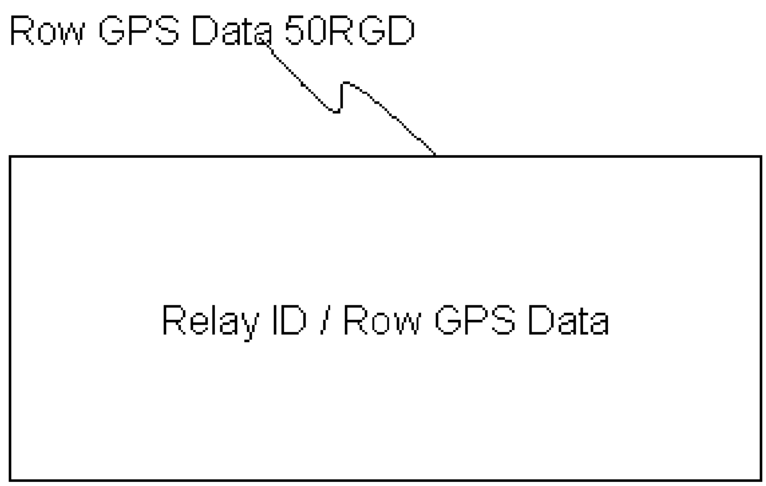

Fig. 1142
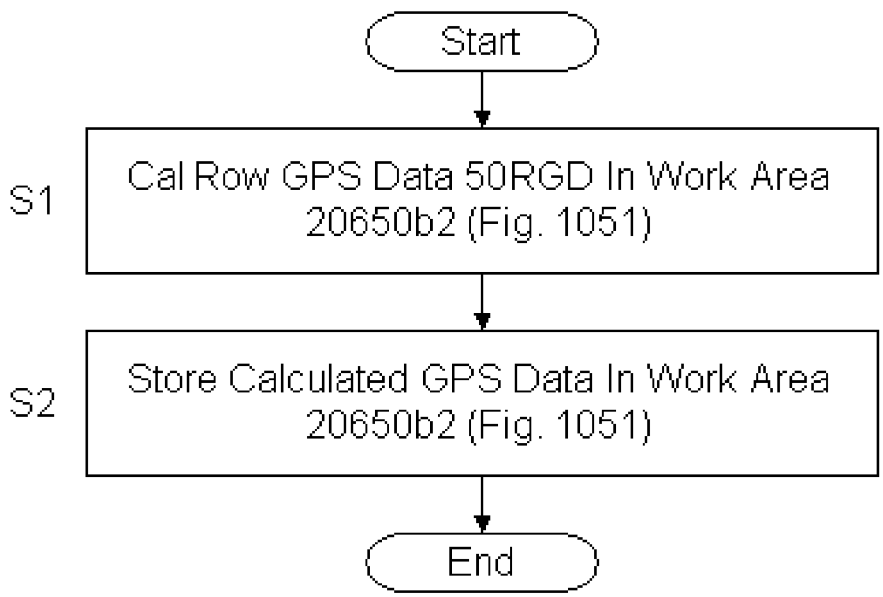

Fig. 1143
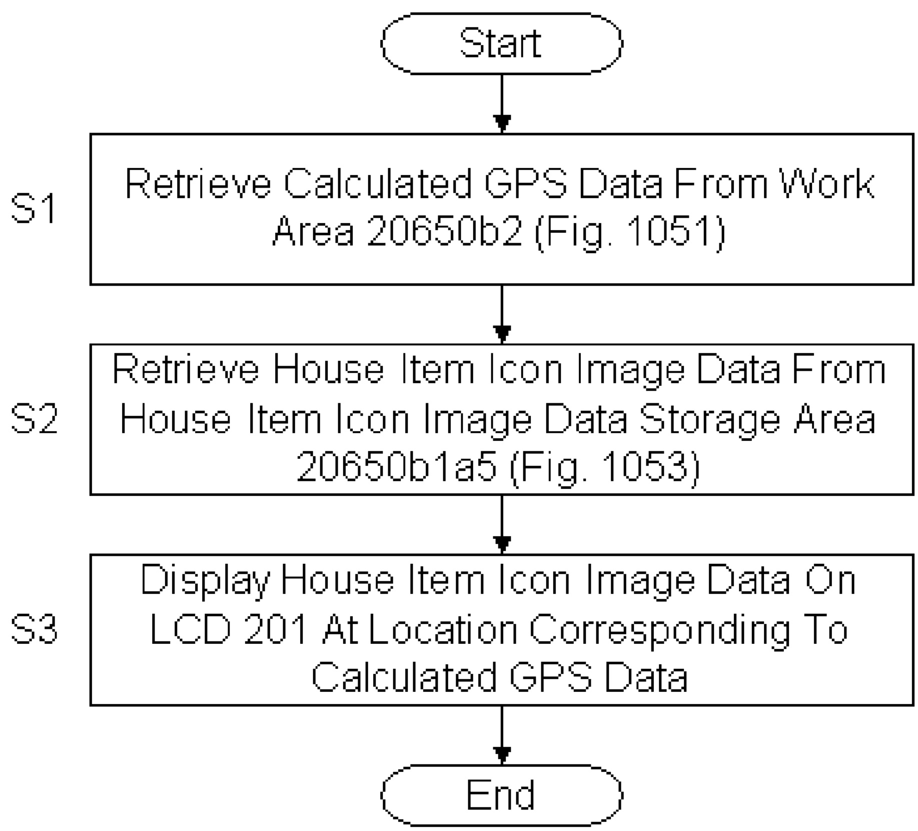

Fig. 1144
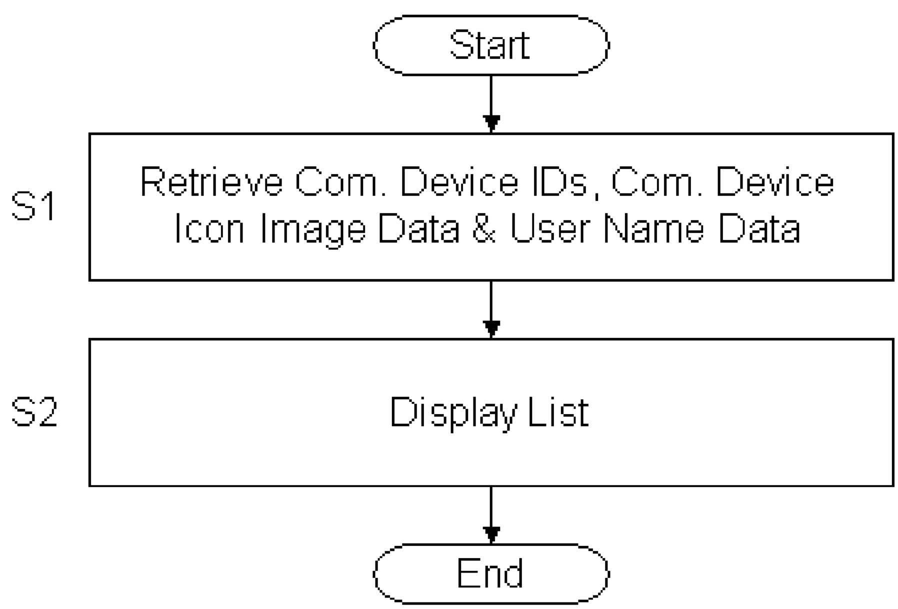

Fig. 1145
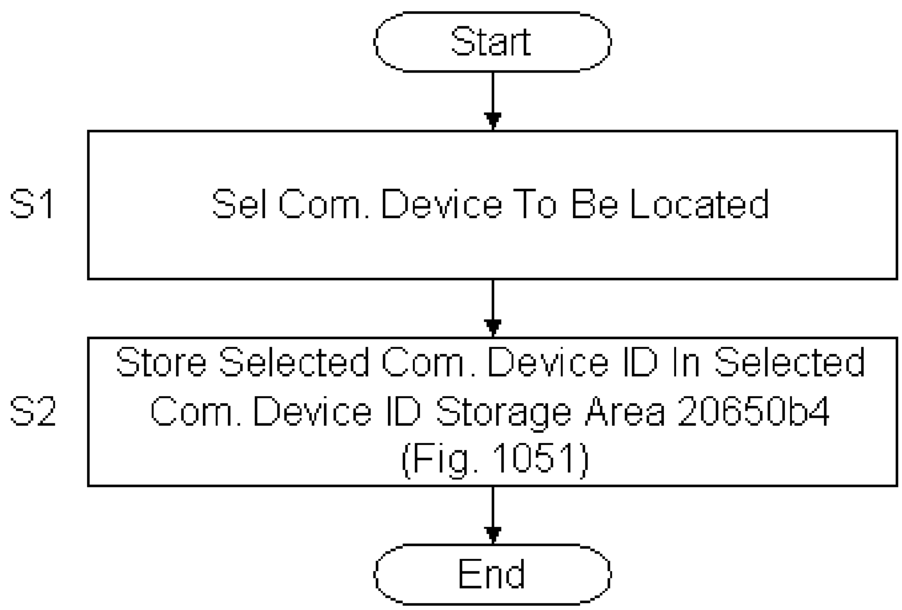

Fig. 1146
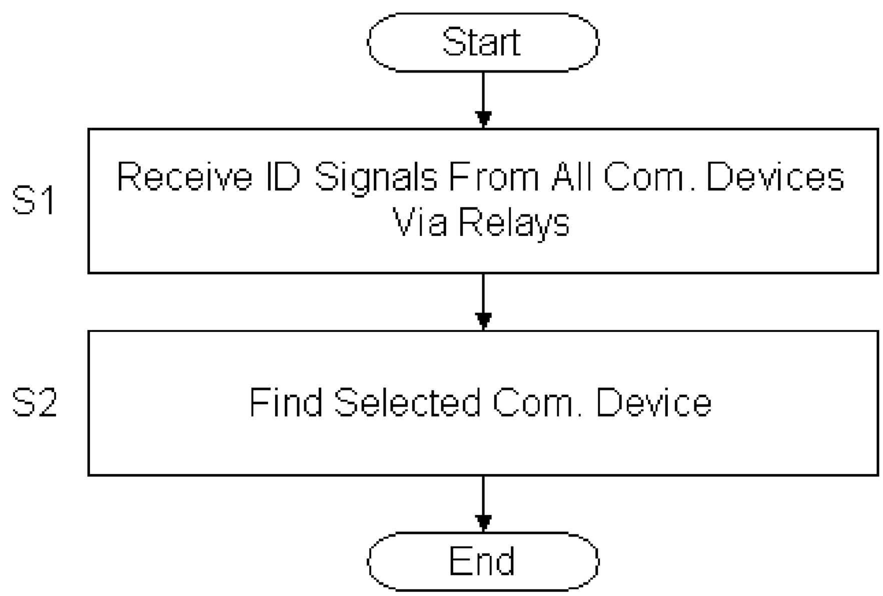

Fig. 1147
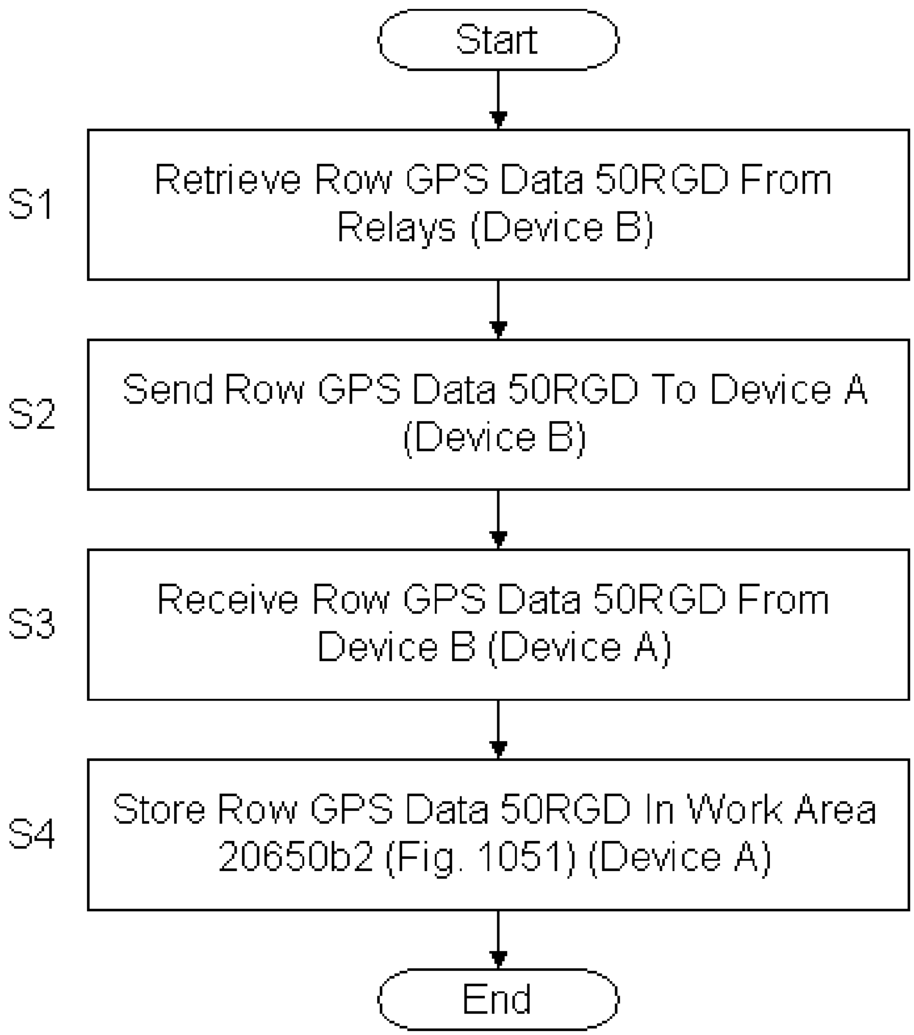

Fig. 1148
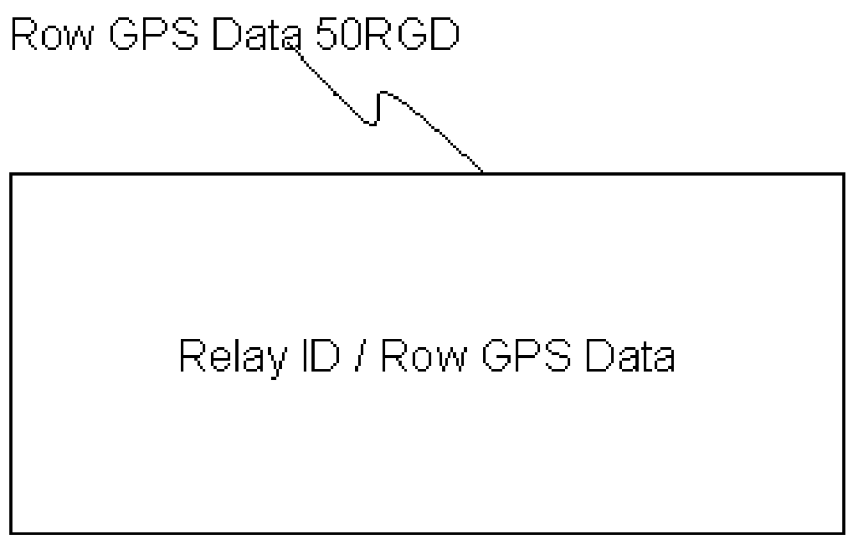

Fig. 1149
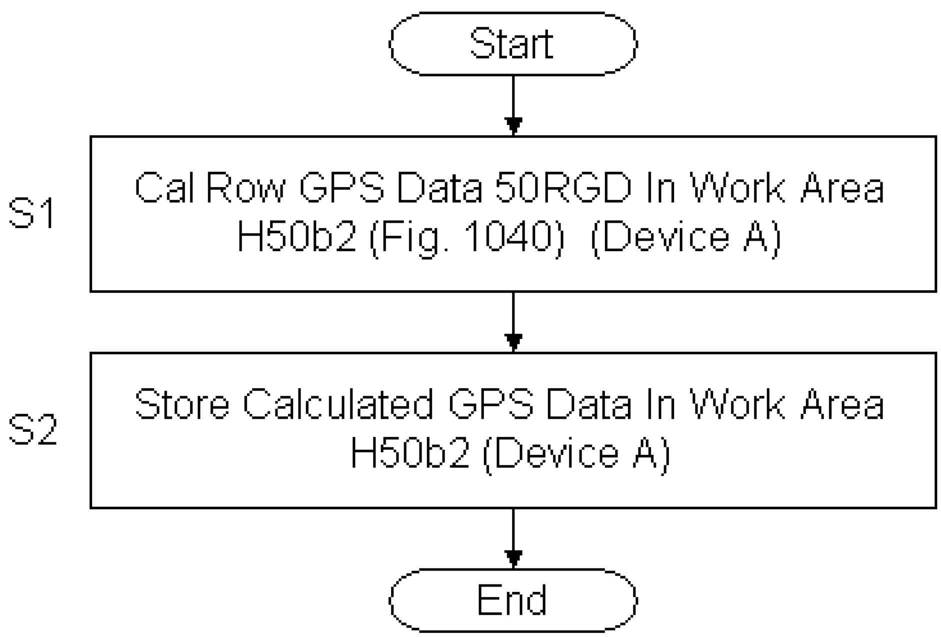

Fig. 1150
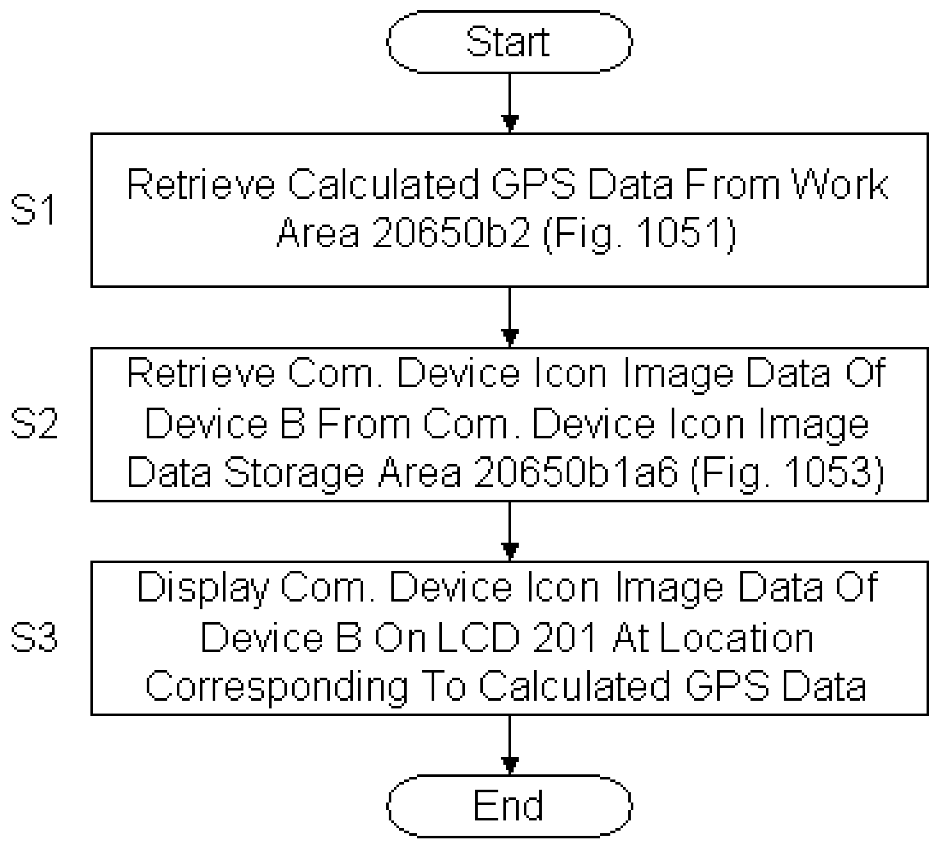

Fig. 1151
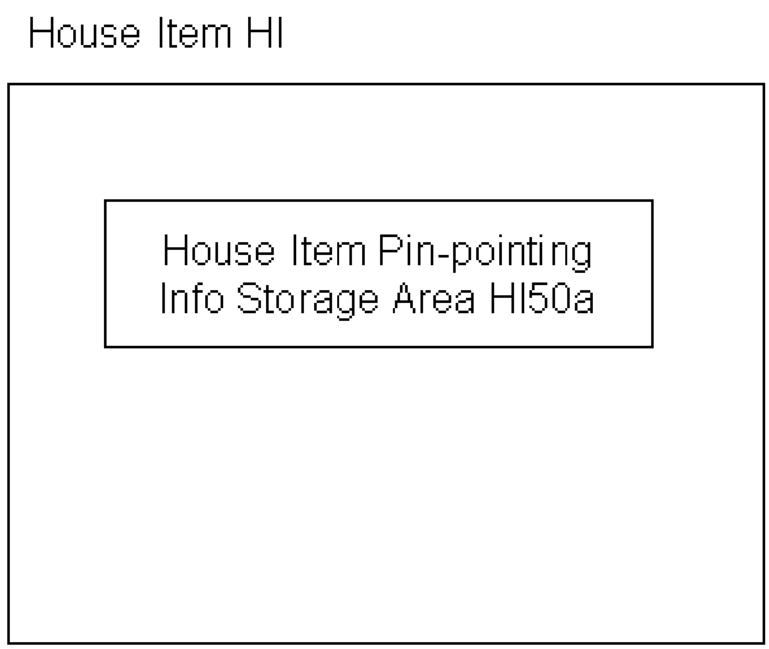

Fig. 1152
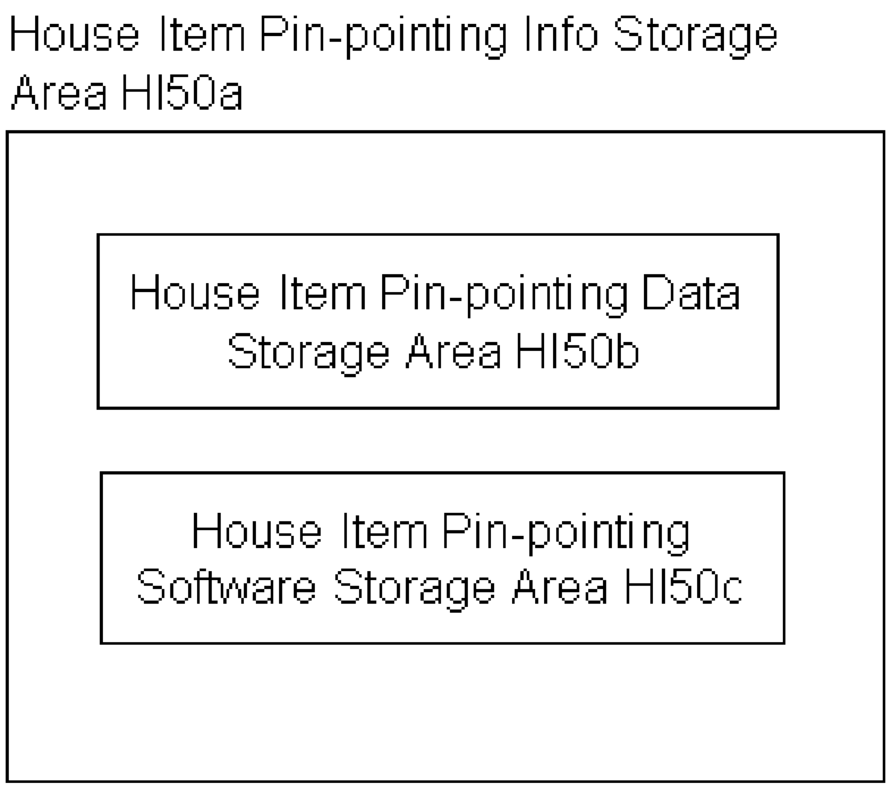

Fig. 1153
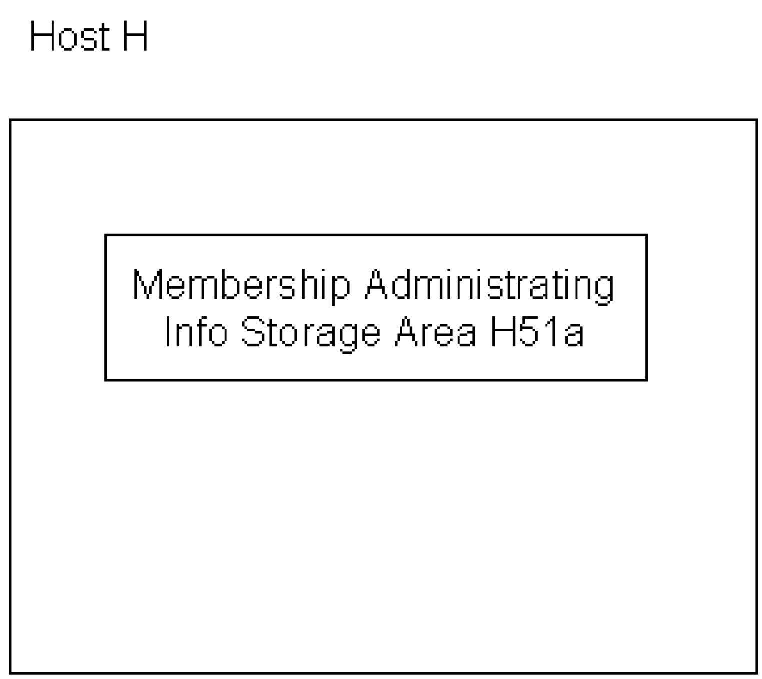

Fig. 1154
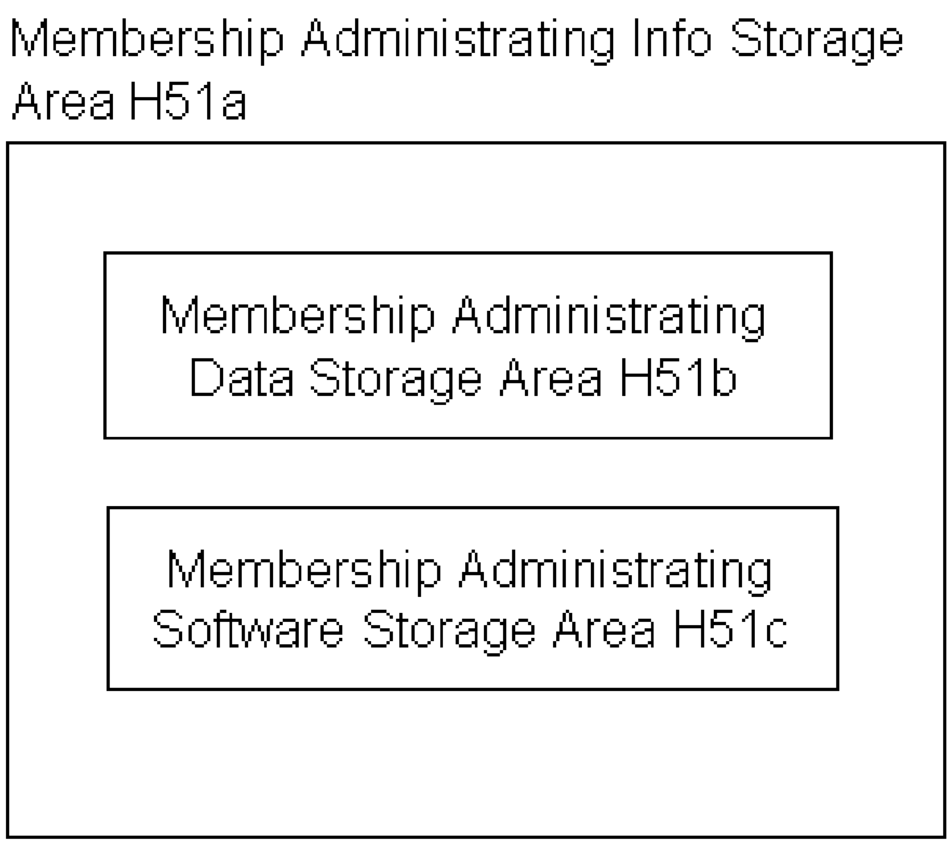

Fig. 1155
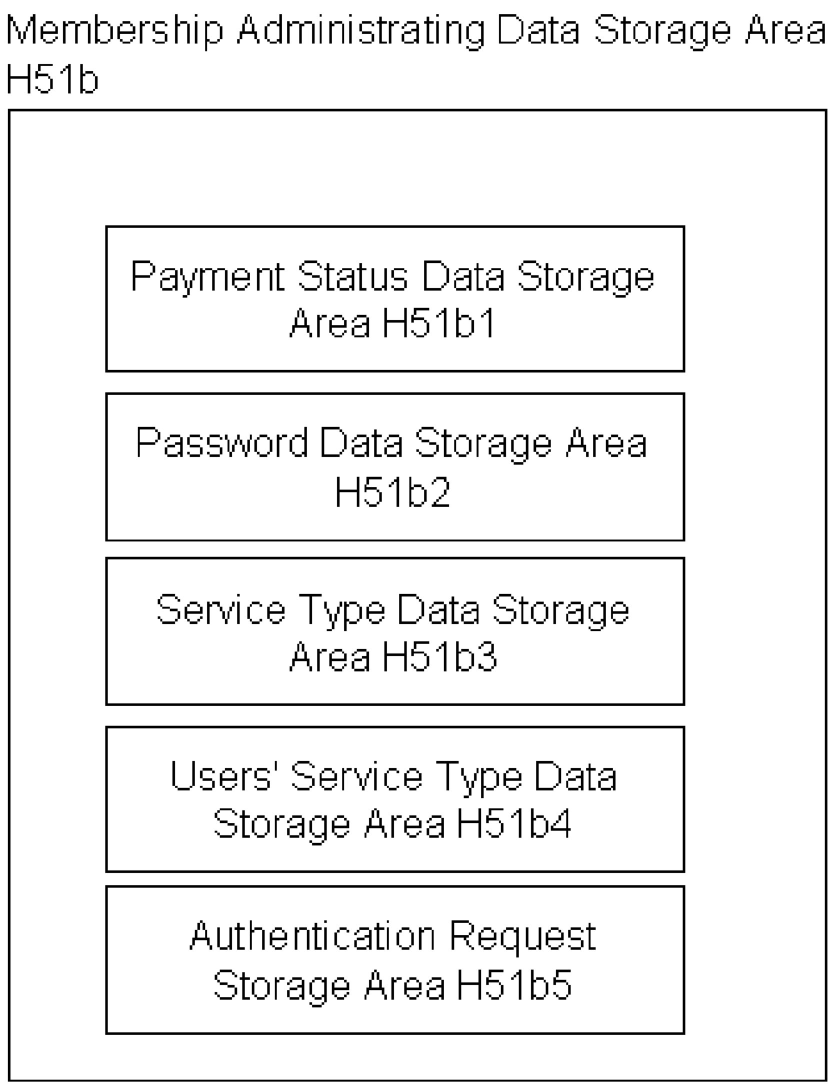

Fig. 1156

Payment Status Data Storage Area H51b1

| User ID | Payment Status Data |
|---|---|
| User #1 | 1 |
| User #2 | 1 |
| User #3 | 0 |
| User #4 | 1 |

Fig. 1157

Password Data Storage Area H51b2

| User ID | Password Data |
| --- | --- |
| User #1 | Password #1 |
| User #2 | Password #2 |
| User #3 | Password #3 |
| User #4 | Password #4 |

Fig. 1158

Service Type Data Storage Area H51b3

| Service Type ID | Available Service Type Data |
|---|---|
| Service Type A | All Functions |
| Service Type B | Function #1, #2, #3 |
| Service Type C | Function #1, #2, #3, #4, #5, #6 |

Fig. 1159

Users' Service Type Data Storage Area H51b4

| User ID | Users' Service Type Data |
|---|---|
| User #1 | Service Type A |
| User #2 | Service Type A |
| User #3 | Service Type B |
| User #4 | Service Type C |

Fig. 1160
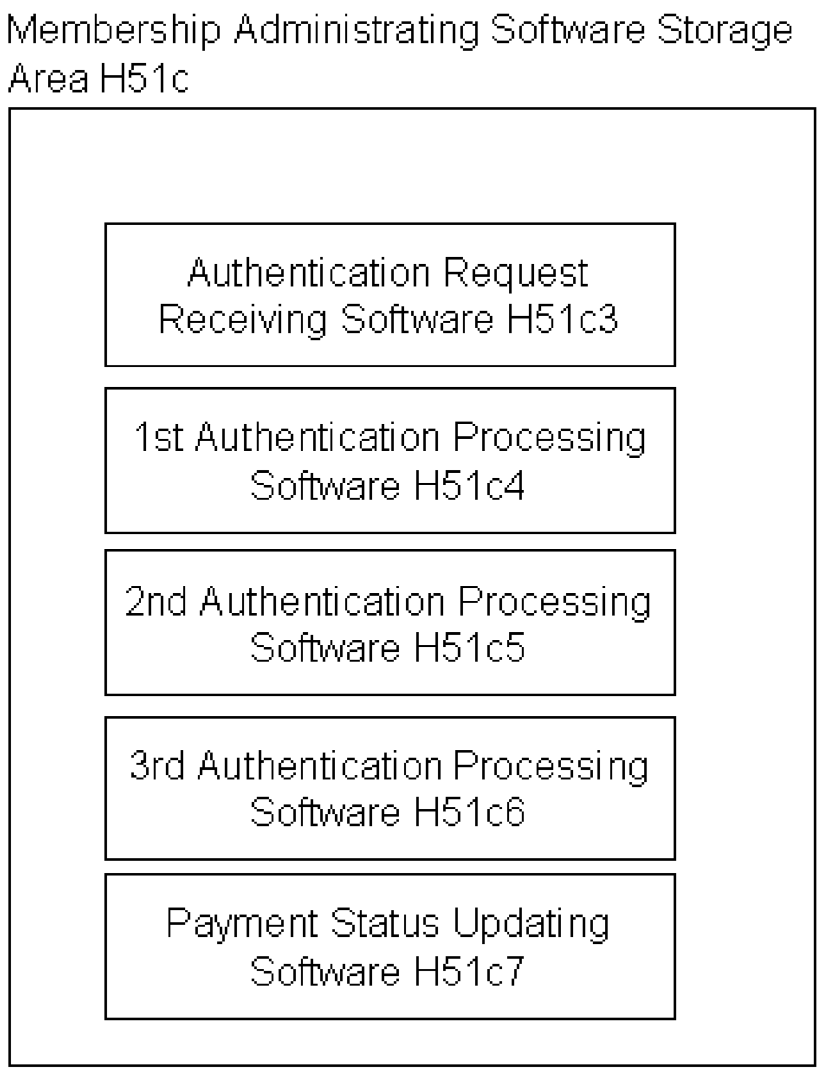

Fig. 1161
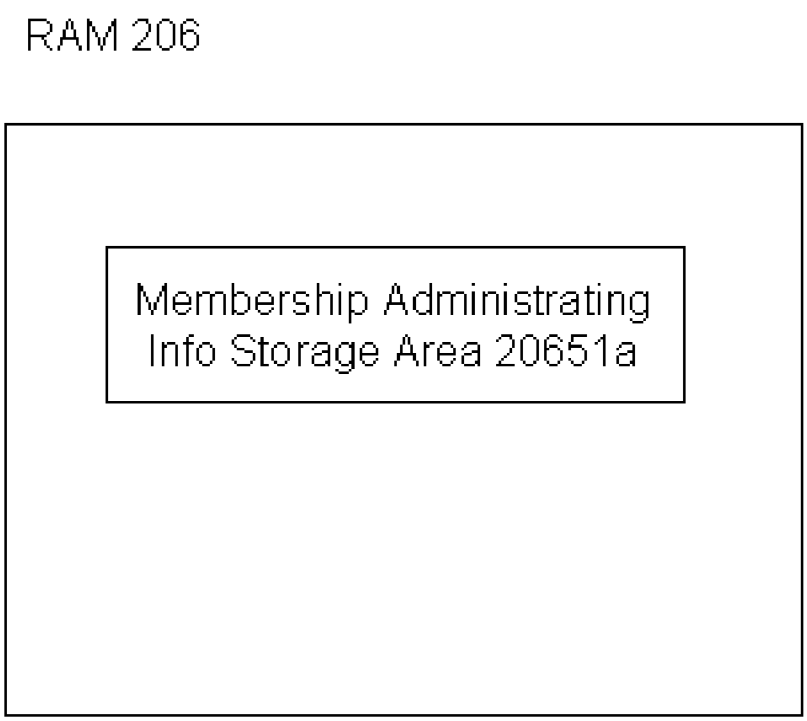

Fig. 1162
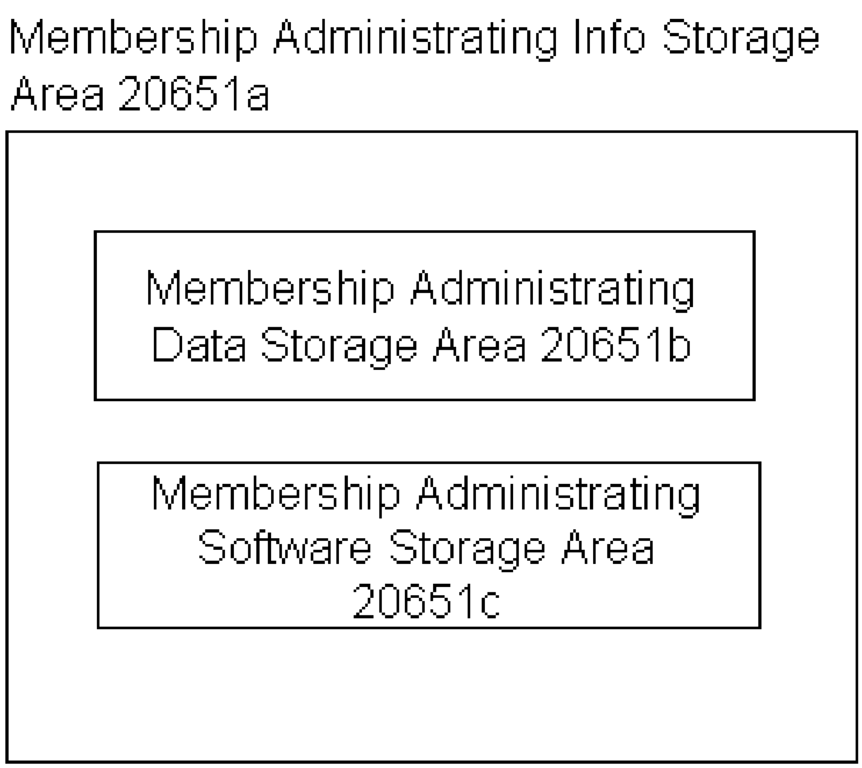

Fig. 1163
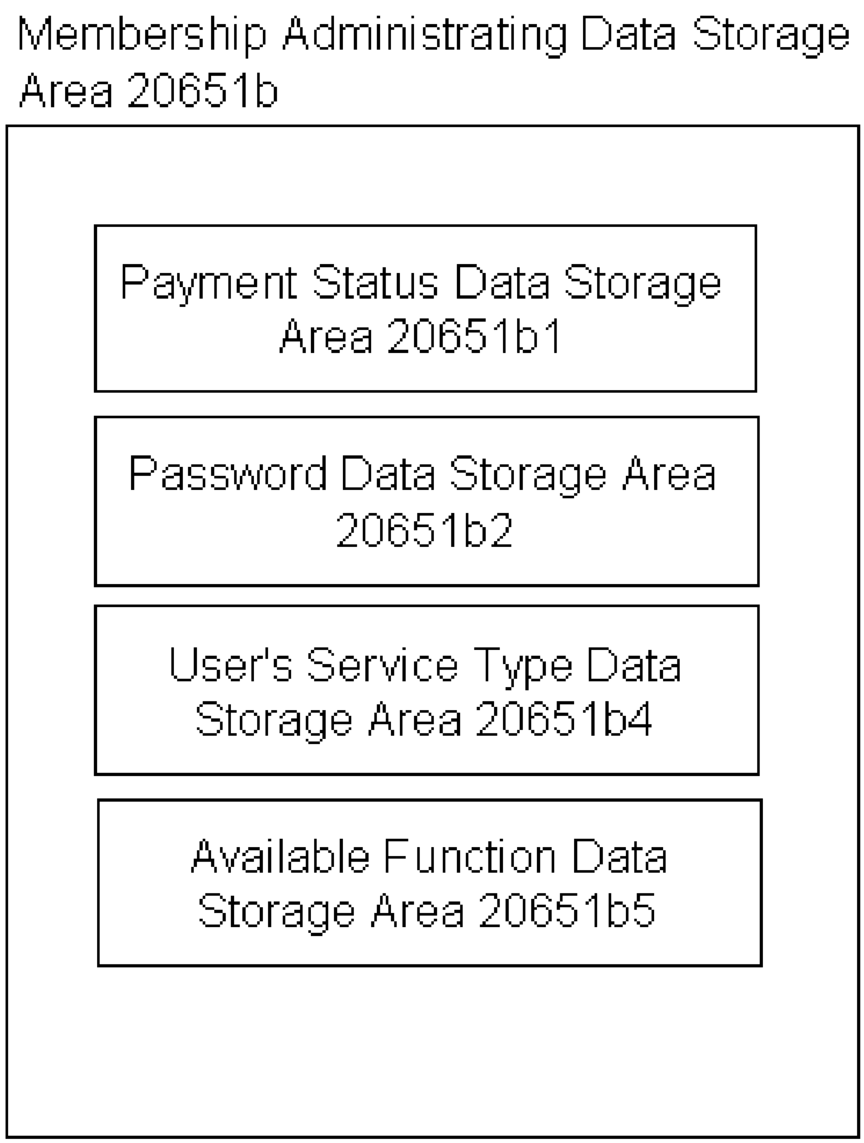

Fig. 1164

Payment Status Data Storage Area
20651b1

| User ID | Payment Status Data |
|---|---|
| User #1 | 1 |

Fig. 1165

Password Data Storage Area 20651b2

| User ID | Password Data |
|---|---|
| User #1 | Password #1 |

Fig. 1166

User's Service Type Data Storage Area
20651b4

| User ID | User's Service Type Data |
|---|---|
| User #1 | Service Type A |

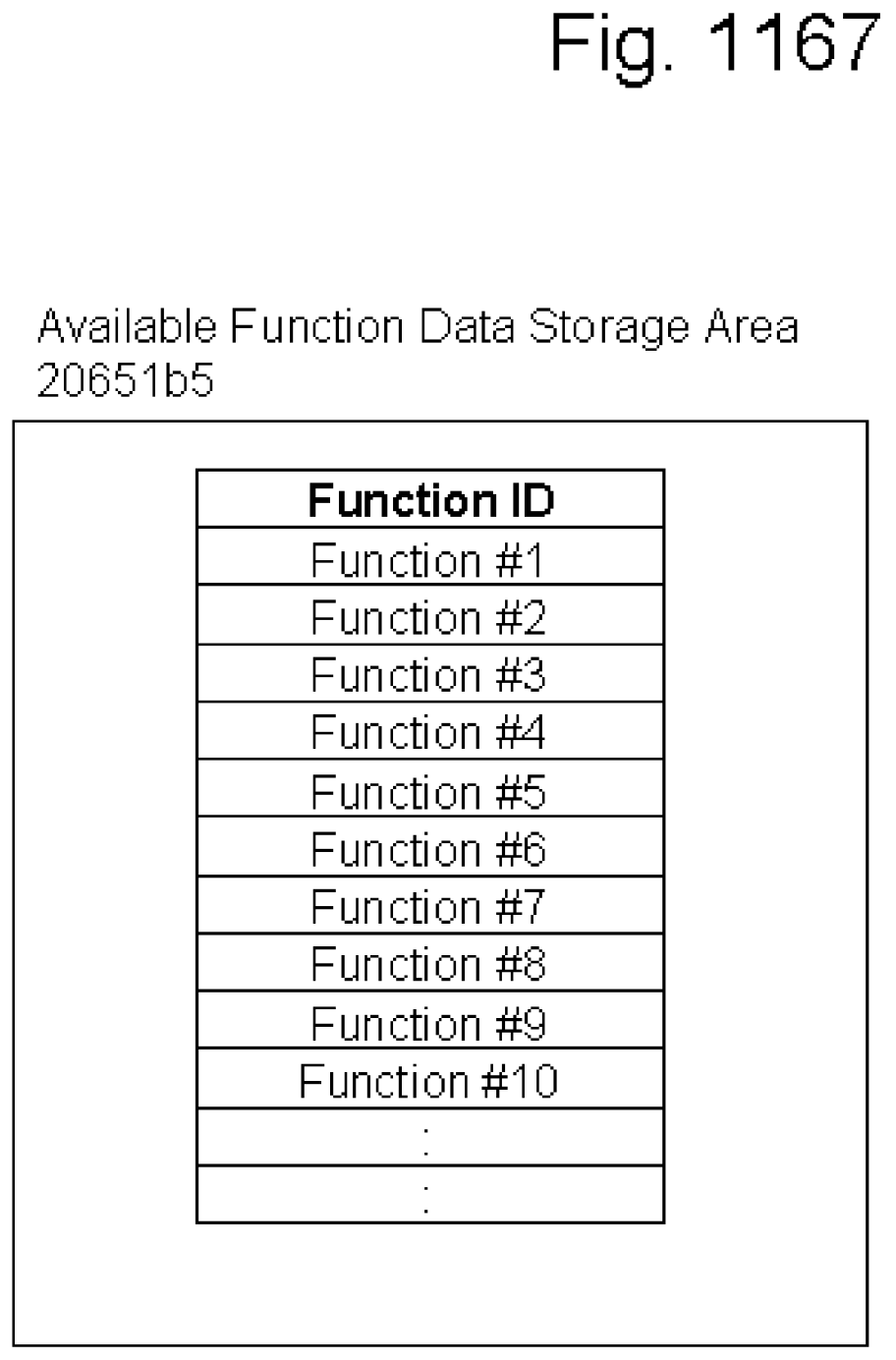

Fig. 1167

Available Function Data Storage Area
20651b5

| Function ID |
| --- |
| Function #1 |
| Function #2 |
| Function #3 |
| Function #4 |
| Function #5 |
| Function #6 |
| Function #7 |
| Function #8 |
| Function #9 |
| Function #10 |
| : |
| : |

Fig. 1168
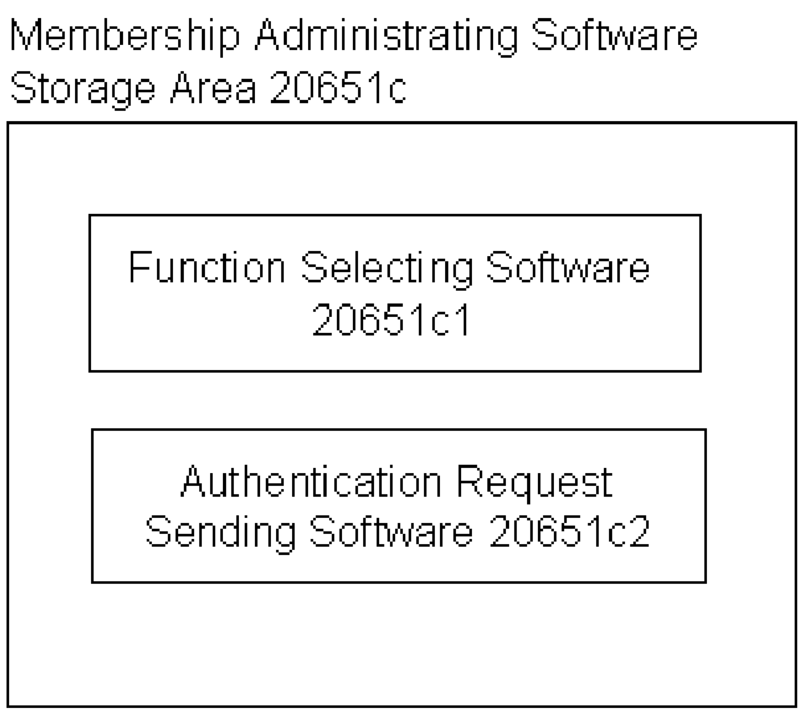

Fig. 1169
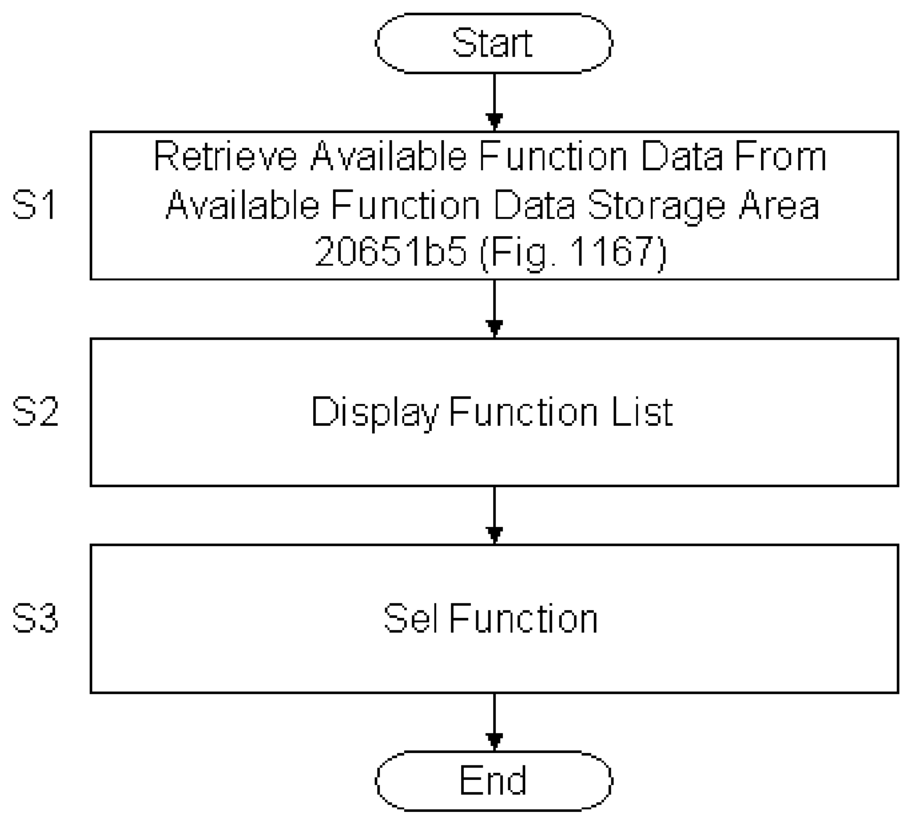

Fig. 1170
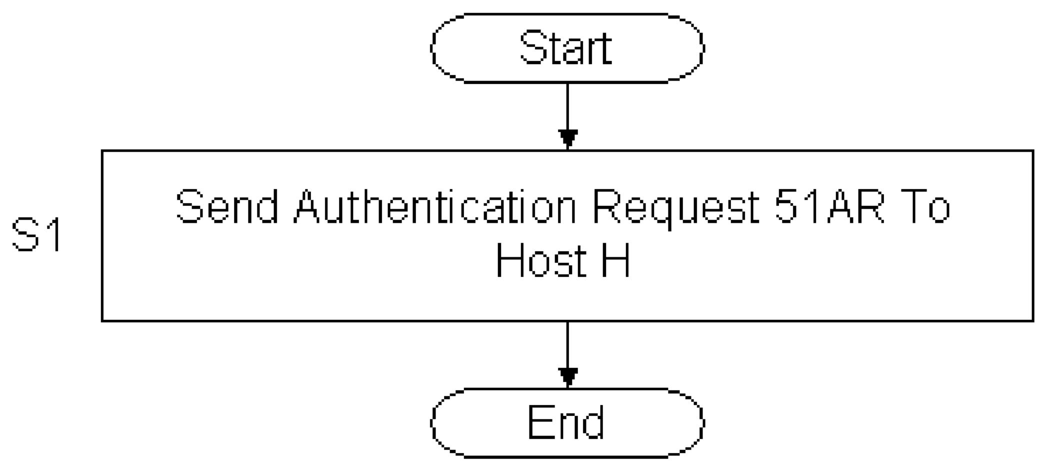

Fig. 1171
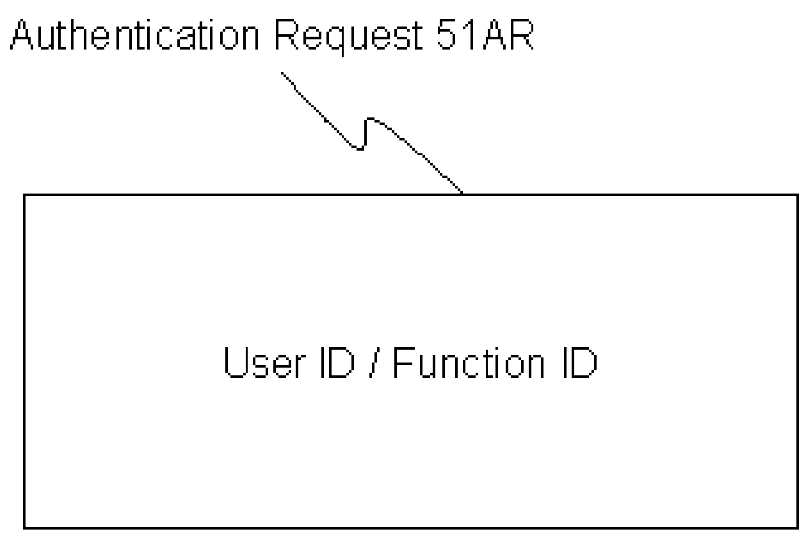

Fig. 1172
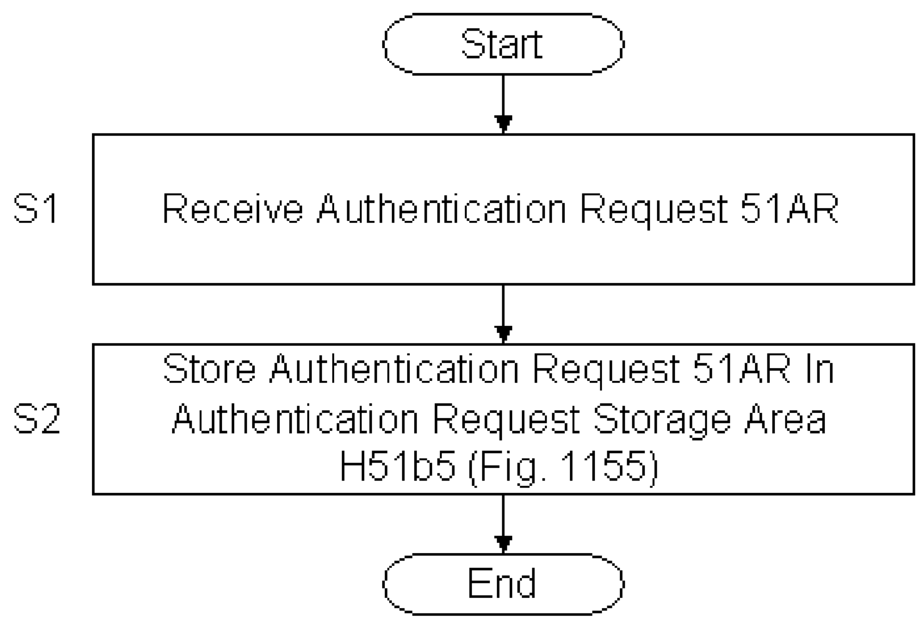

Fig. 1173
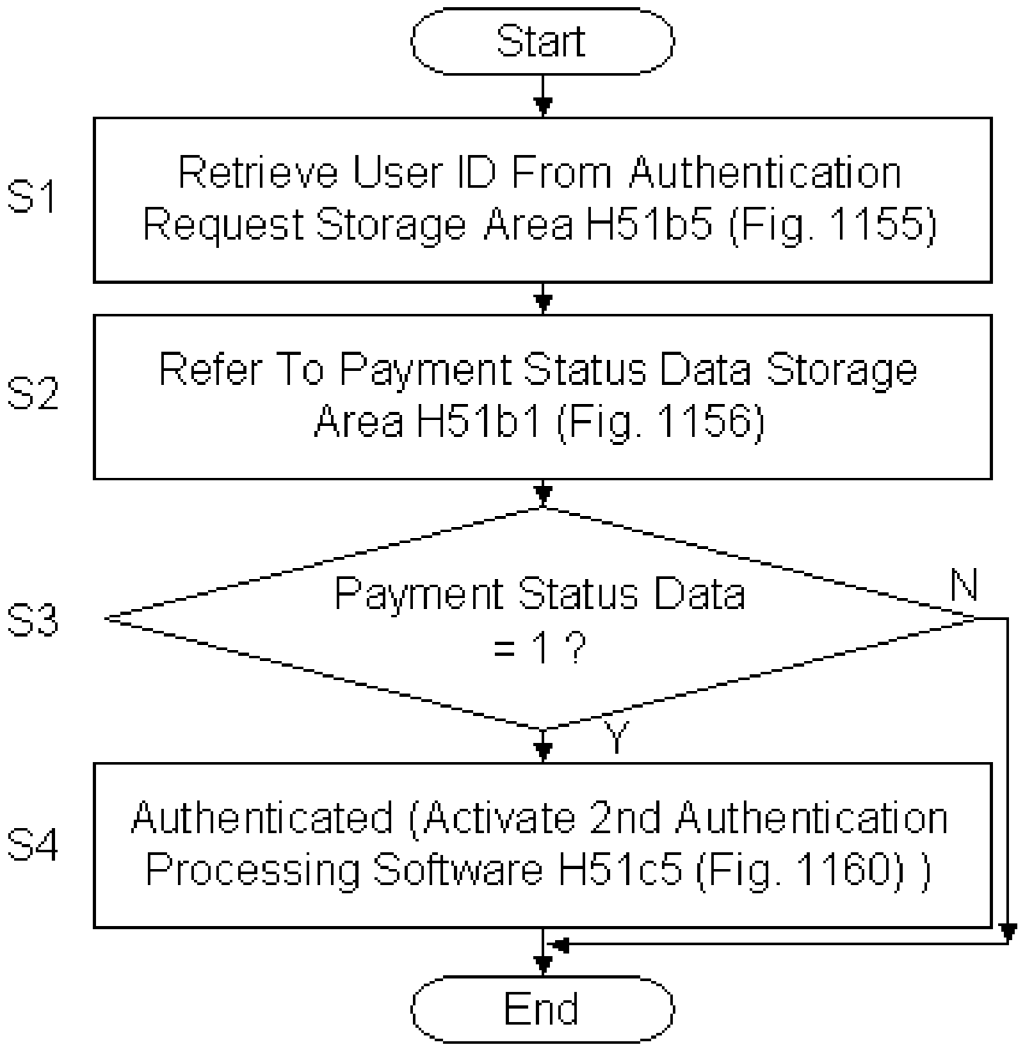

Fig. 1174
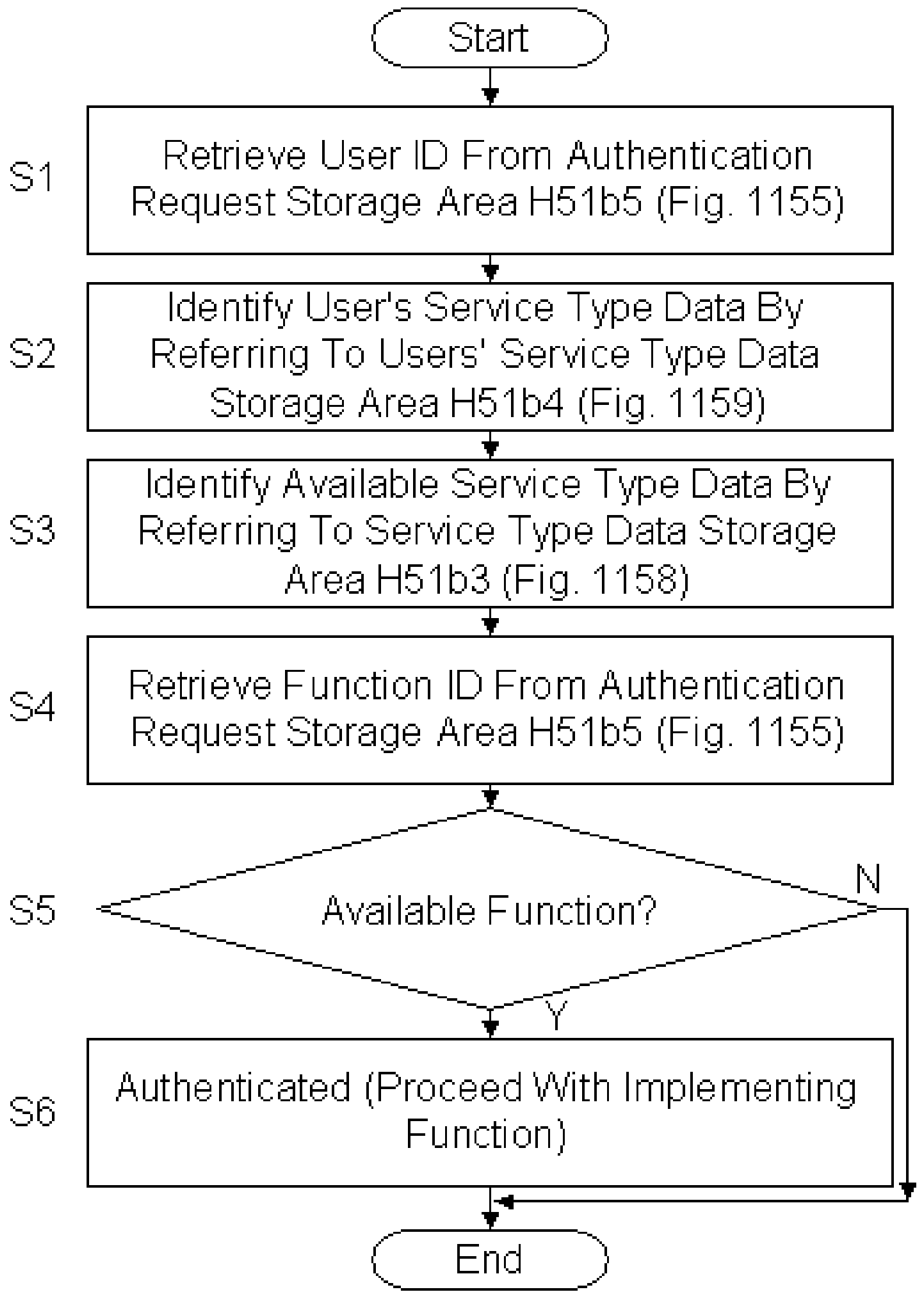

Fig. 1175
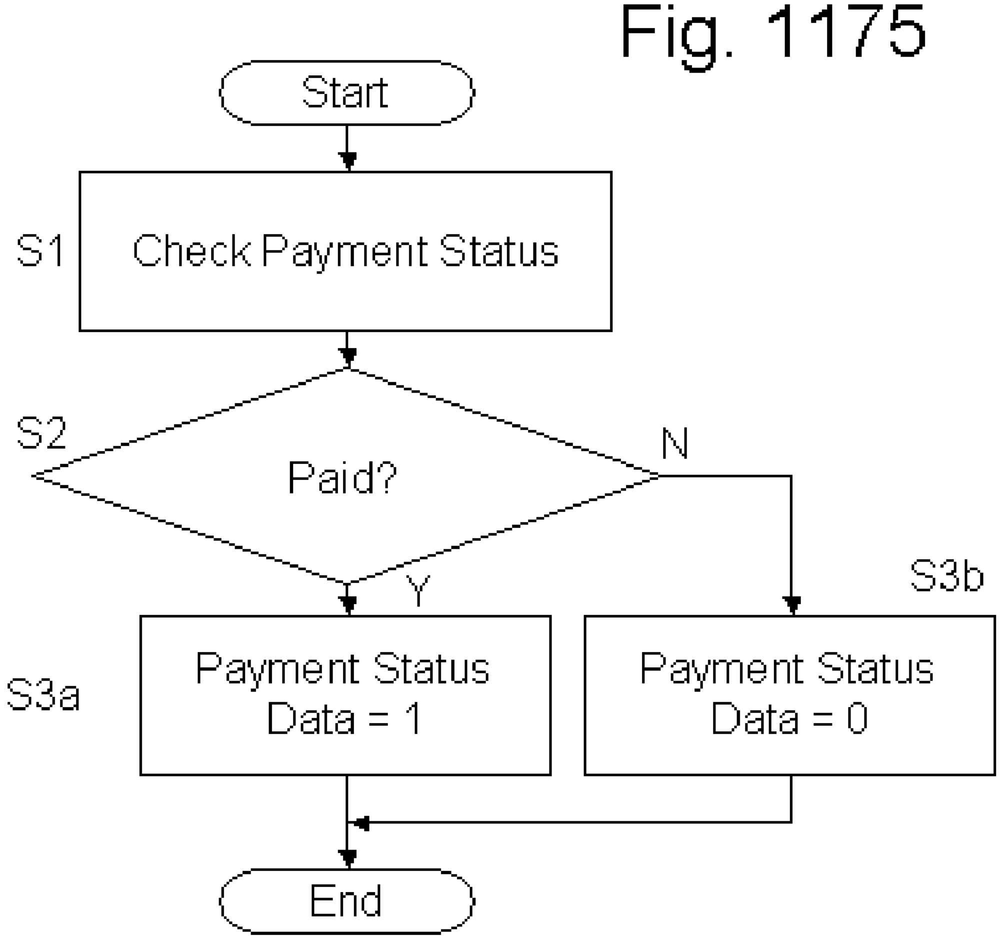

Fig. 1176
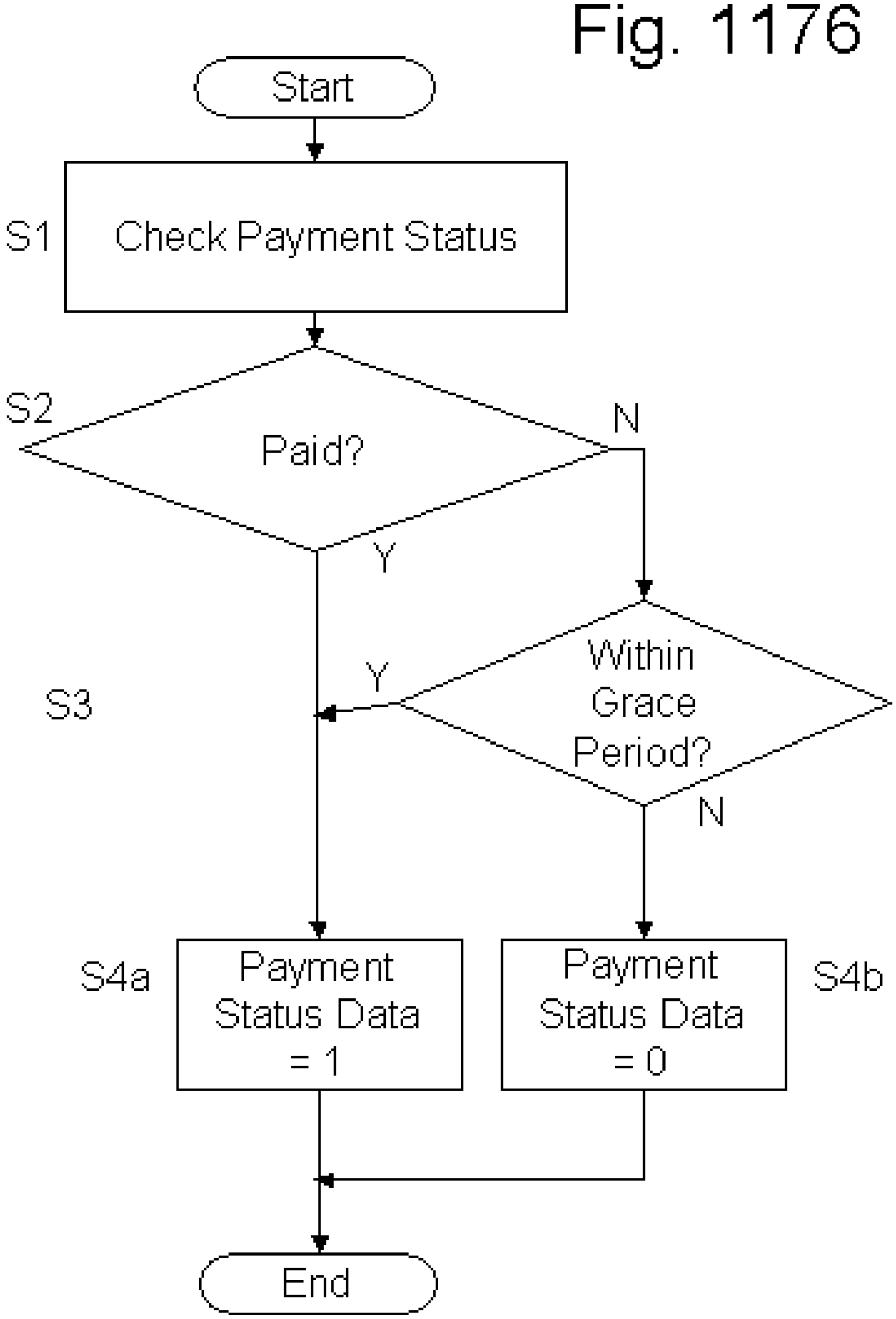

Fig. 1177
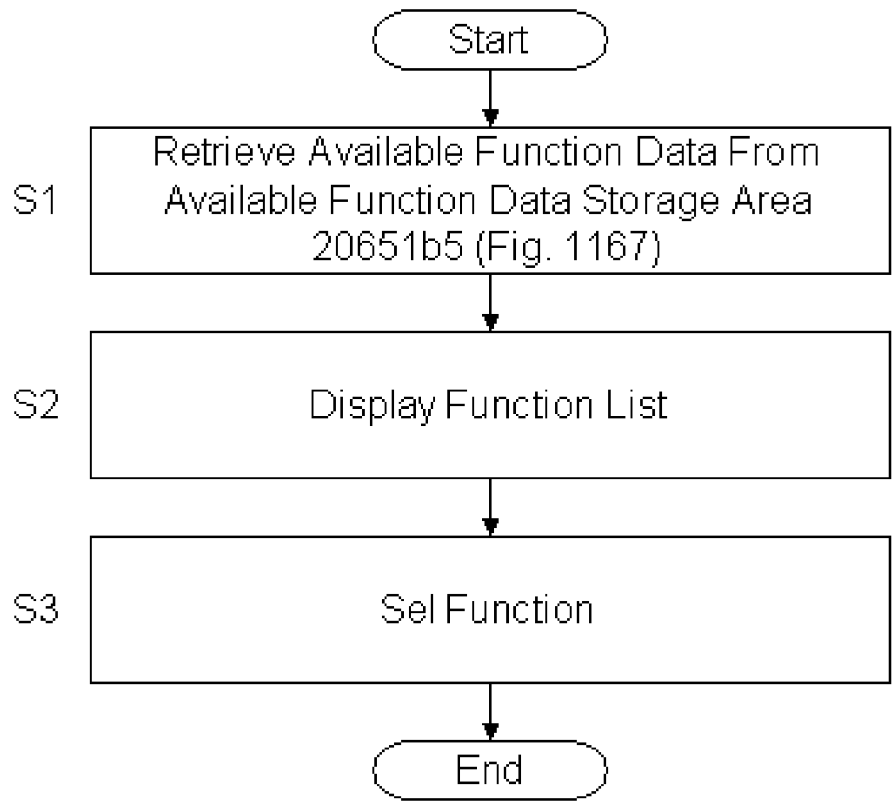

Fig. 1178
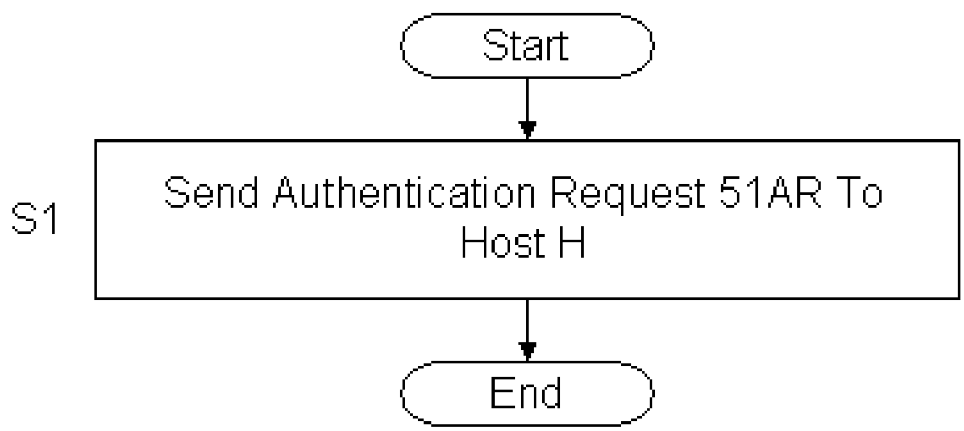

Fig. 1179
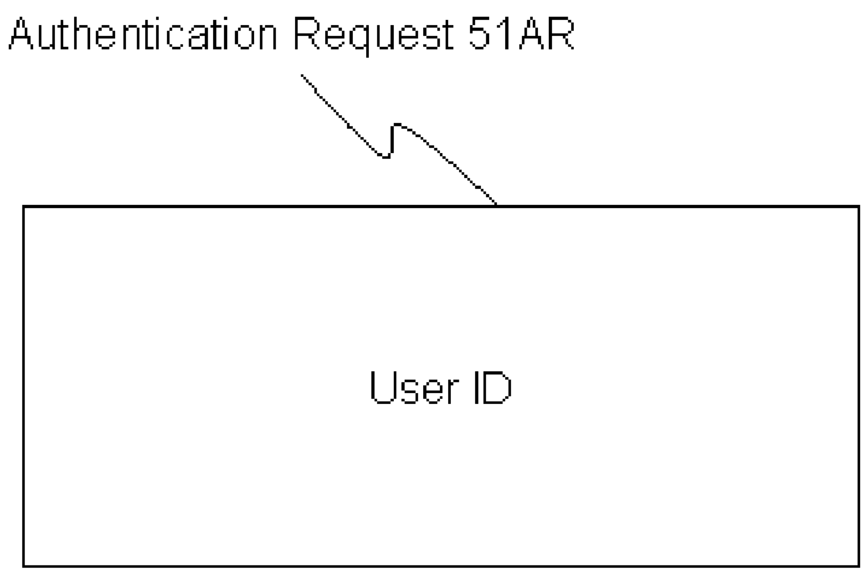

Fig. 1180
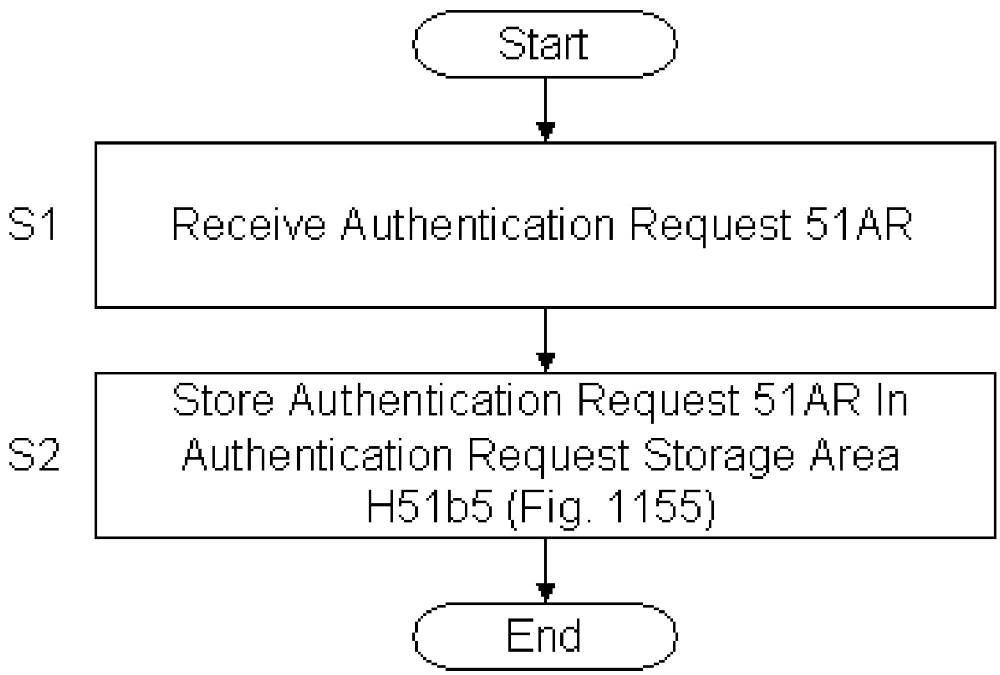

Fig. 1181
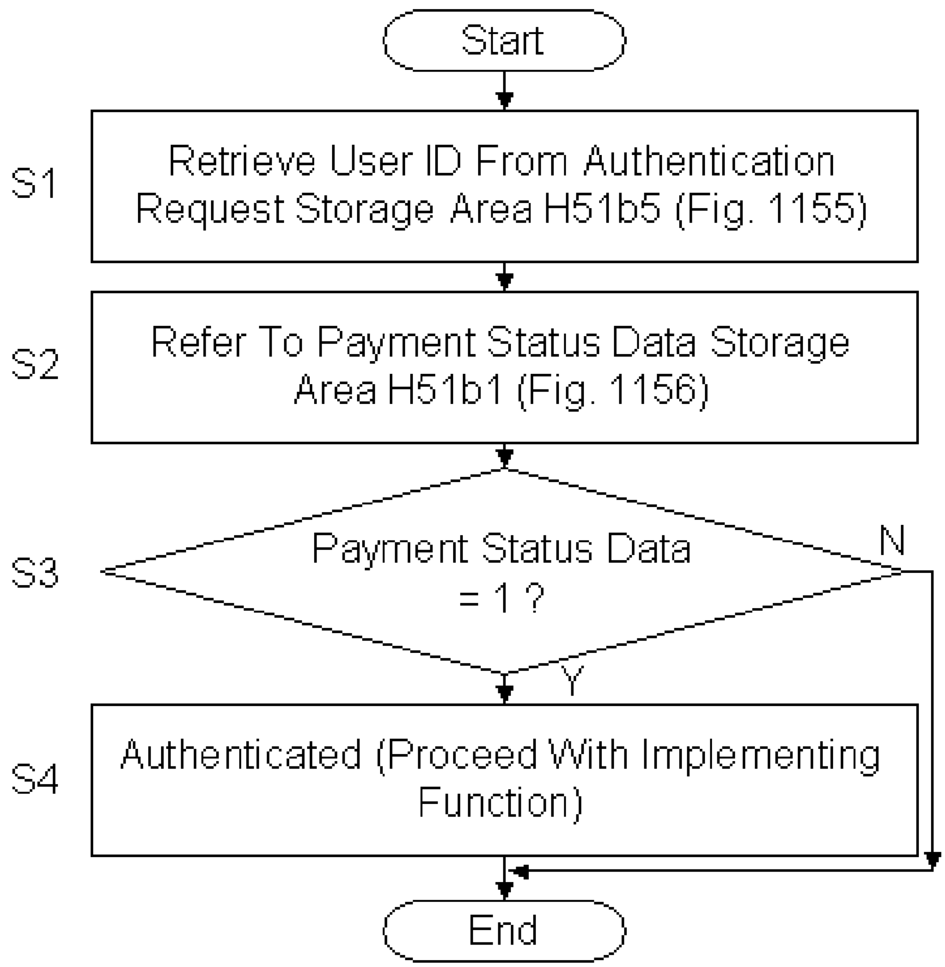

Fig. 1182
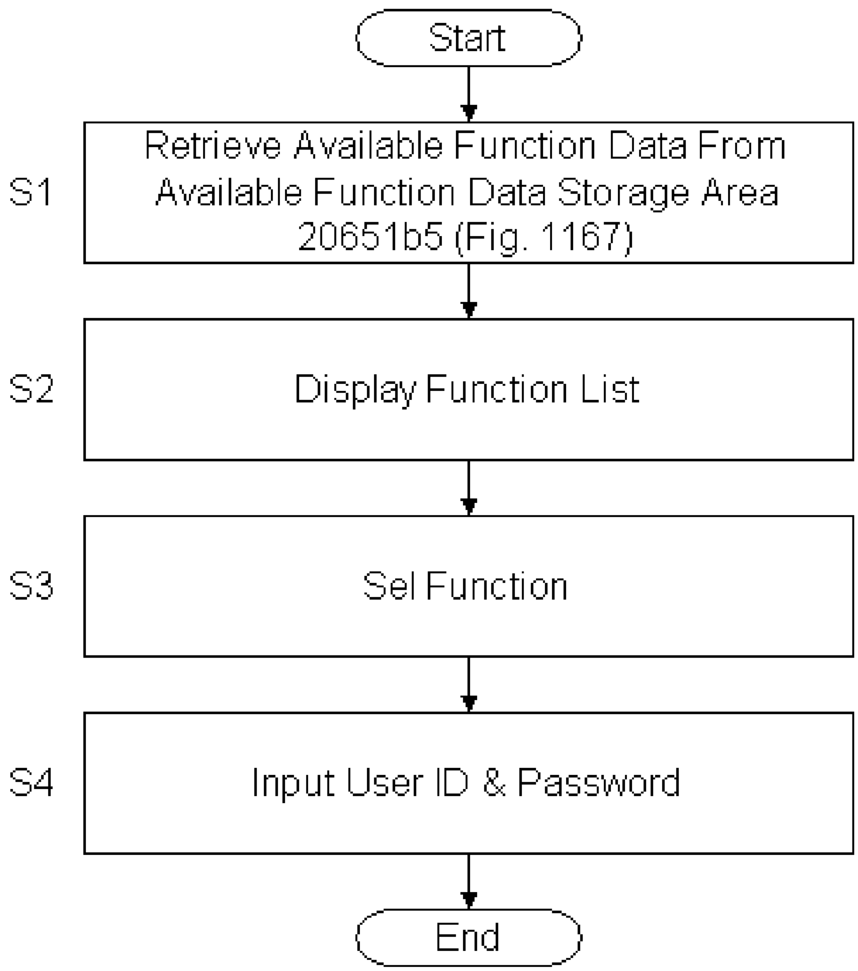

Fig. 1183
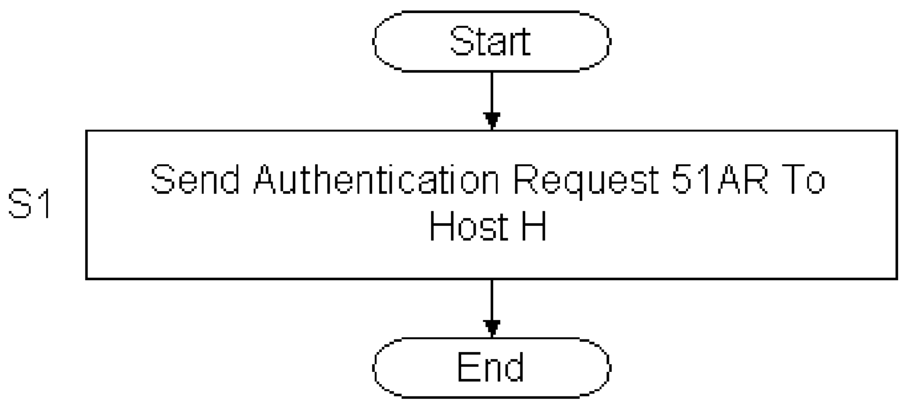

Fig. 1184
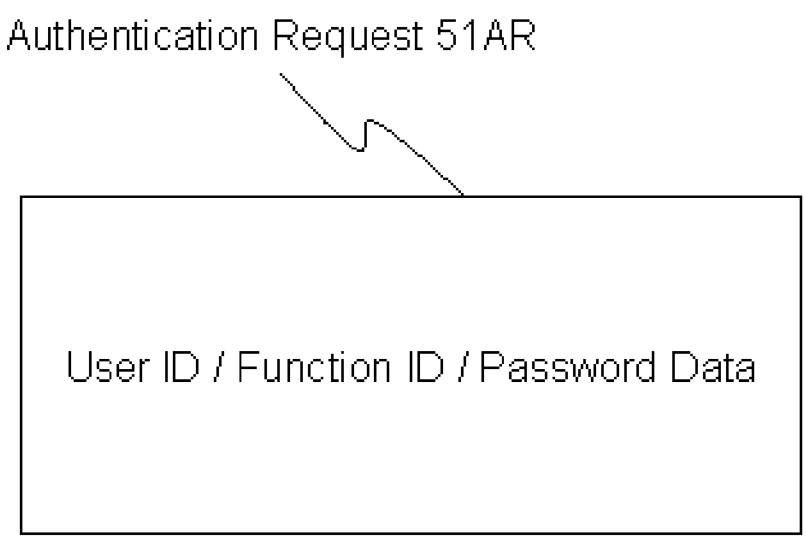

Fig. 1185
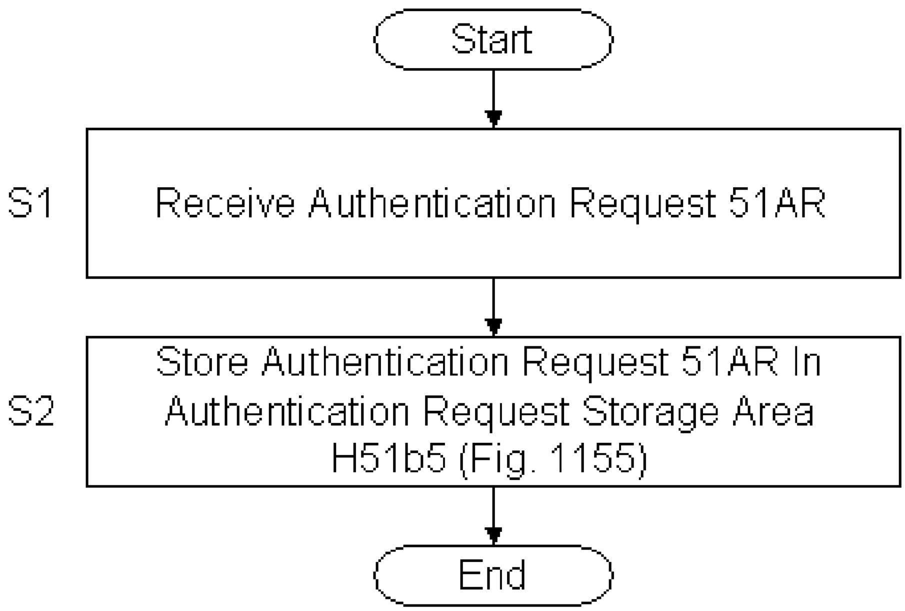

Fig. 1186
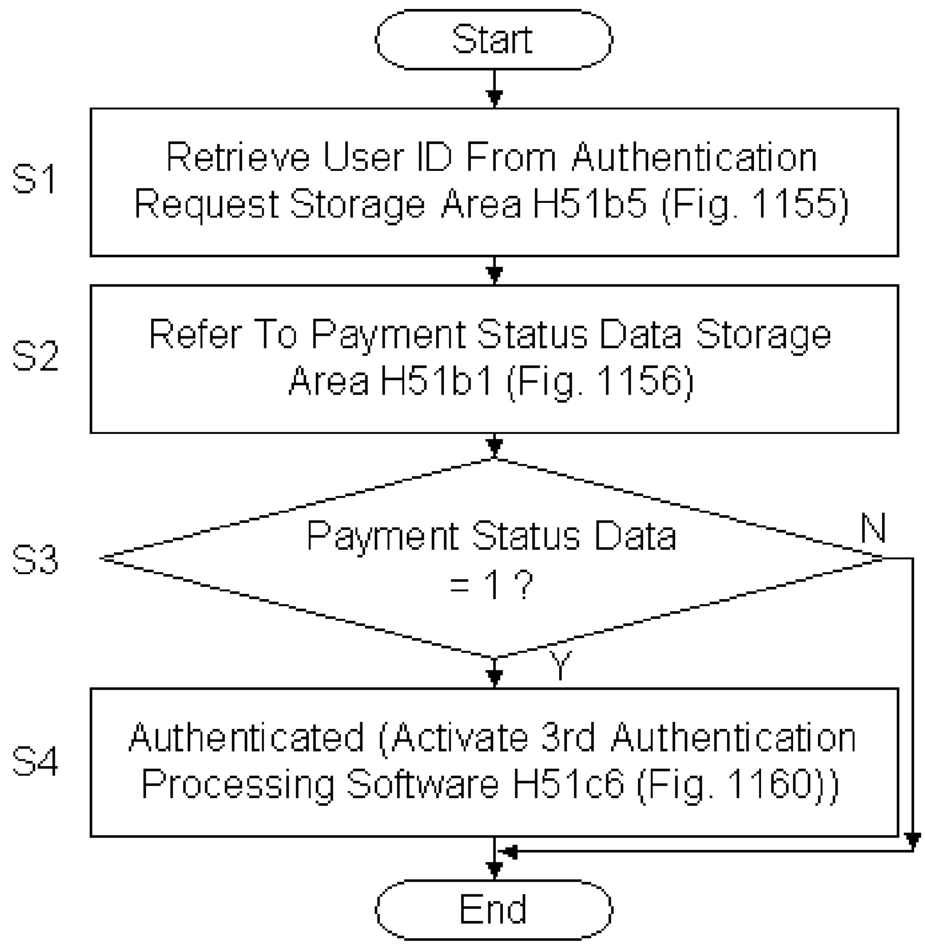

Fig. 1187
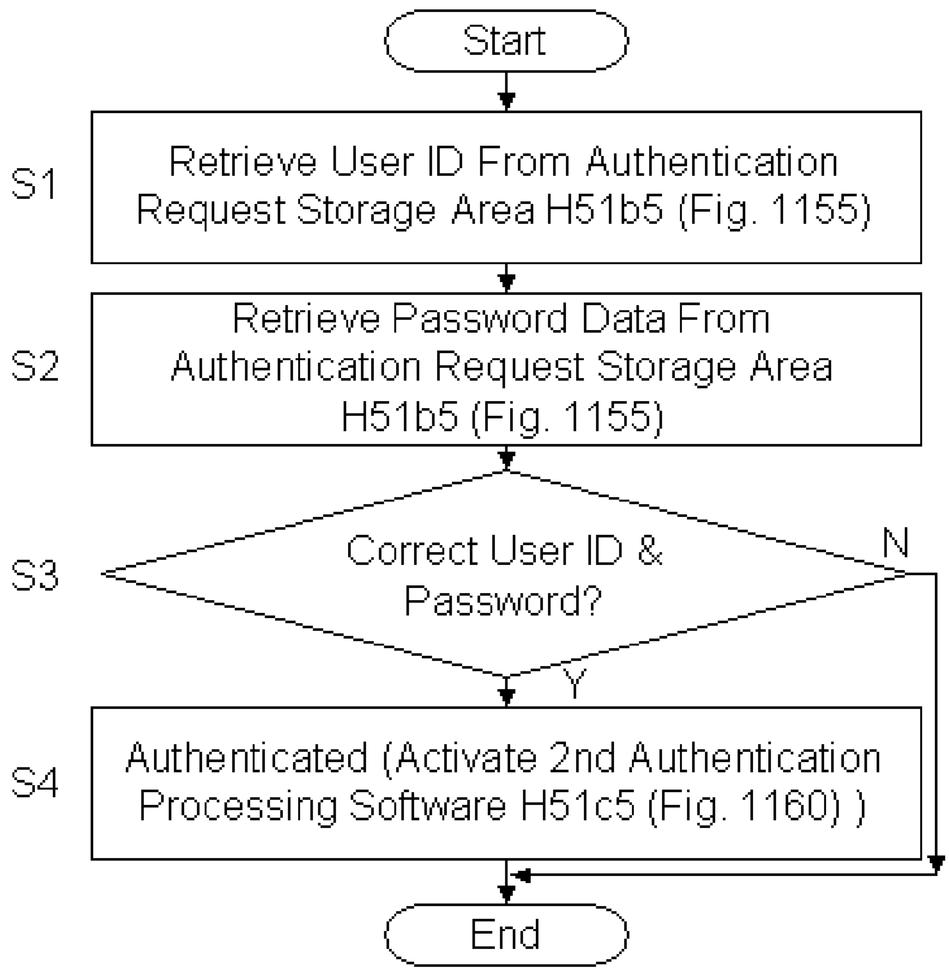

Fig. 1188
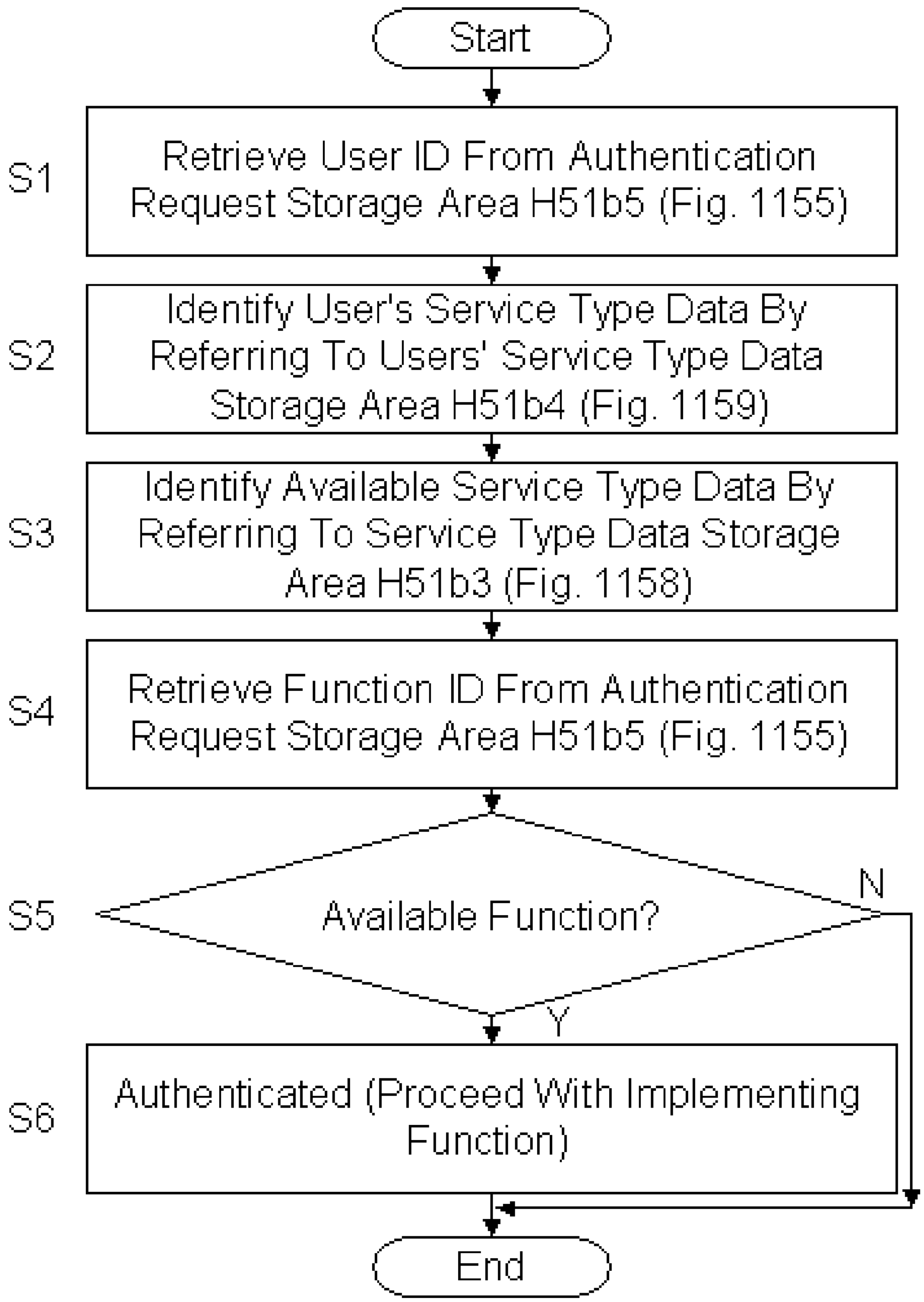

Fig. 1189

Fig. 1190
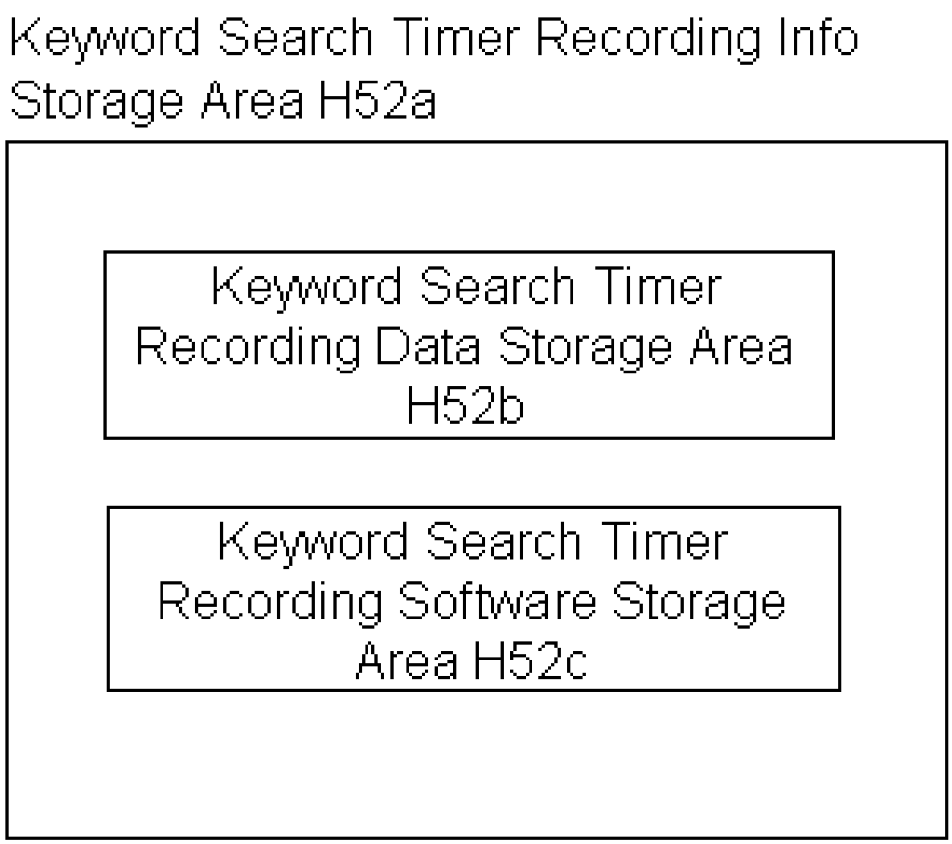

Fig. 1191
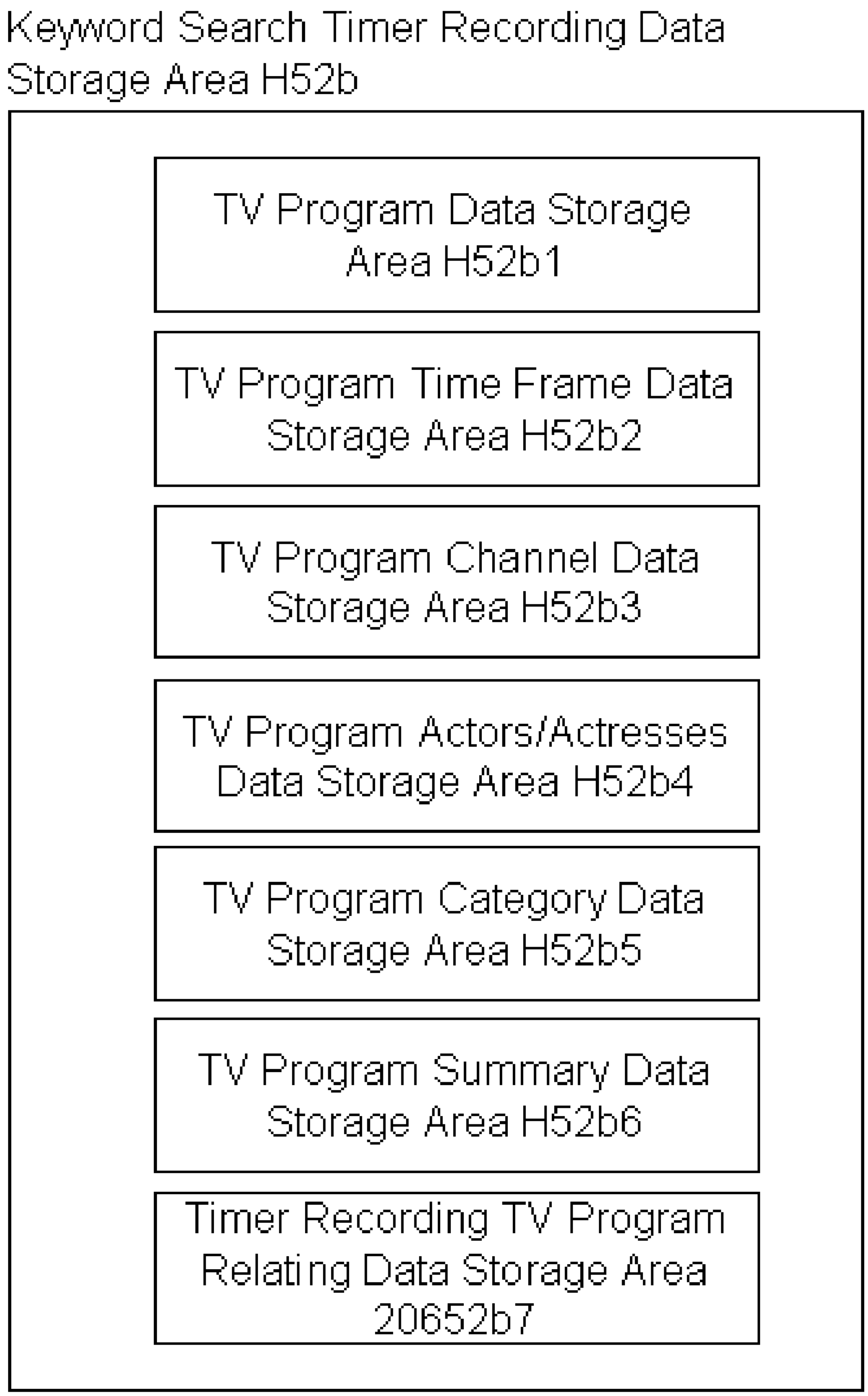

Fig. 1192

TV Program Data Storage Area H52b1

| TV Program ID | TV Program Data |
|---|---|
| TV Program #1 | TV Program Data #1 |
| TV Program #2 | TV Program Data #2 |
| TV Program #3 | TV Program Data #3 |
| TV Program #4 | TV Program Data #4 |
| TV Program #5 | TV Program Data #5 |
| TV Program #6 | TV Program Data #6 |

Fig. 1193

TV Program Time Frame Data Storage Area H52b2

| TV Program ID | TV Program Time Frame Data #1 | TV Program Time Frame Data #2 |
|---|---|---|
| TV Program #1 | 19:00 - 19:30 | 20:30 - 21:00 |
| TV Program #2 | 19:30 - 20:30 | Null |
| TV Program #3 | 21:30 - 22:00 | Null |
| TV Program #4 | 21:00 - 22:00 | Null |
| TV Program #5 | 19:00 - 20:00 | 20:30 - 21:30 |
| TV Program #6 | 20:00 - 20:30 | Null |

Fig. 1194

TV Program Time Frame Data Storage Area H52b2

| TV Program ID | TV Program Time Frame Data #1 | Re-run Flag |
|---|---|---|
| TV Program #1 | 19:00 - 19:30 | 0 |
| TV Program #2 | 19:30 - 20:30 | 0 |
| TV Program #3 | 21:30 - 22:00 | 0 |
| TV Program #4 | 21:00 - 22:00 | 0 |
| TV Program #5 | 19:00 - 20:00 | 0 |
| TV Program #6 | 20:00 - 20:30 | 0 |
| TV Program #1 | 20:30 - 21:00 | 1 |
| TV Program #5 | 20:30 - 21:30 | 1 |

Fig. 1195

TV Program Channel Data Storage Area H52b3

| TV Program ID | TV Program Channel Data |
|---|---|
| TV Program #1 | Ch 1 |
| TV Program #2 | Ch 1 |
| TV Program #3 | Ch 2 |
| TV Program #4 | Ch 1 |
| TV Program #5 | Ch 2 |
| TV Program #6 | Ch 2 |

Fig. 1196

TV Program Actors/Actresses Data Storage Area H52b4

| TV Program ID | Actors/Actresses Data |
|---|---|
| TV Program #1 | Actor #1, Actress #2 |
| TV Program #2 | Actor #3, Actress #3, Actress #4 |
| TV Program #3 | Actress #5, Actress #6 |
| TV Program #4 | Actor #7, Actor #8 |
| TV Program #5 | Actress #9 |
| TV Program #6 | Actor #10, Actor #11, Actress #12 |

Fig. 1197

TV Program Category Data Storage Area H52b5

| TV Program ID | Category Data |
|---|---|
| TV Program #1 | Science Fiction |
| TV Program #2 | Situation Comedy |
| TV Program #3 | News |
| TV Program #4 | Documentary |
| TV Program #5 | Science Fiction |
| TV Program #6 | Situation Comedy |

Fig. 1198

TV Program Summary Data Storage Area H52b6

| TV Program ID | Summary Data |
|---|---|
| TV Program #1 | Summary #1 |
| TV Program #2 | Summary #2 |
| TV Program #3 | Summary #3 |
| TV Program #4 | Summary #4 |
| TV Program #5 | Summary #5 |
| TV Program #6 | Summary #6 |

Fig. 1199

Timer Recording TV Program Relating Data Storage Area H52b7

User #1

| TV Program ID | TV Program Channel Data | TV Program Time Frame Data #1 | Record Completed Flag Data | TV Program Data |
|---|---|---|---|---|
| | | | | |
| | | | | |

User #2

| TV Program ID | TV Program Channel Data | TV Program Time Frame Data #1 | Record Completed Flag Data | TV Program Data |
|---|---|---|---|---|
| | | | | |
| | | | | |

User #3

| TV Program ID | TV Program Channel Data | TV Program Time Frame Data #1 | Record Completed Flag Data | TV Program Data |
|---|---|---|---|---|
| | | | | |
| | | | | |

Fig. 1200
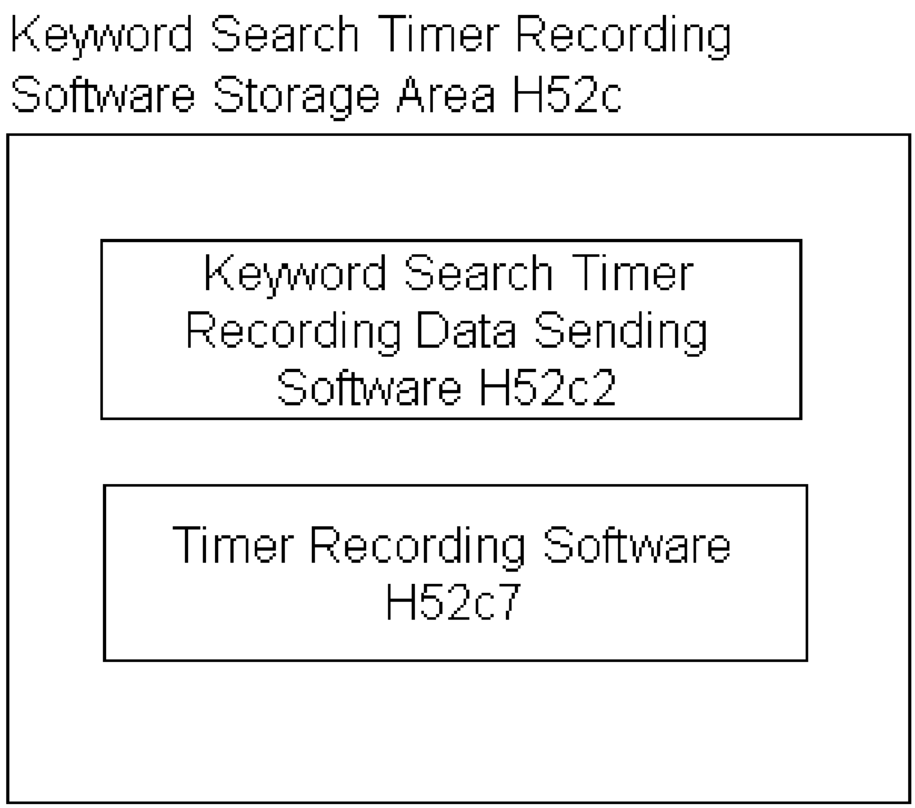

Fig. 1201
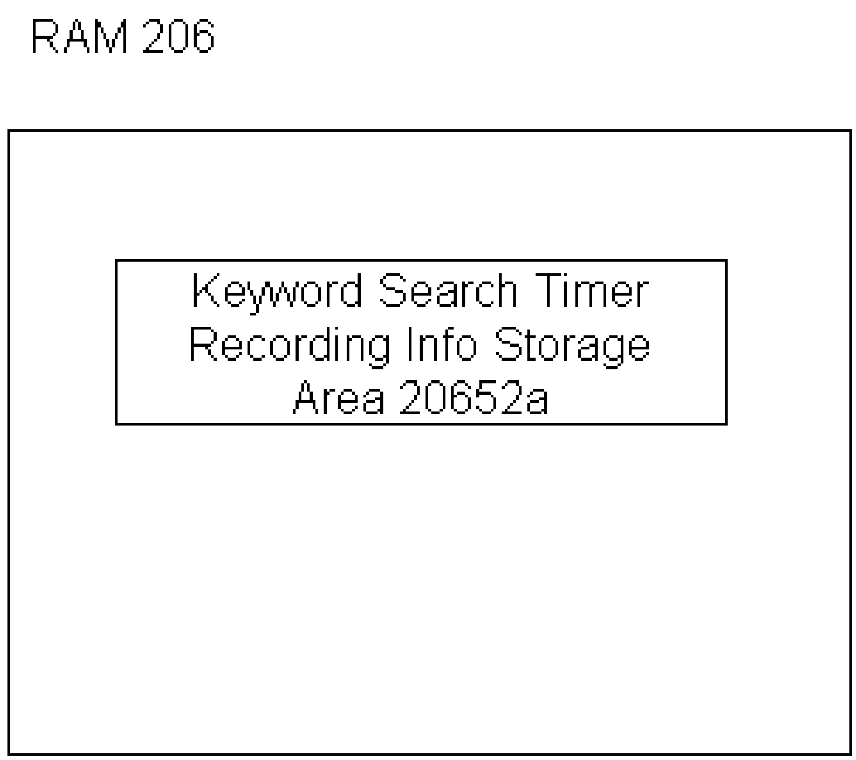

Fig. 1202
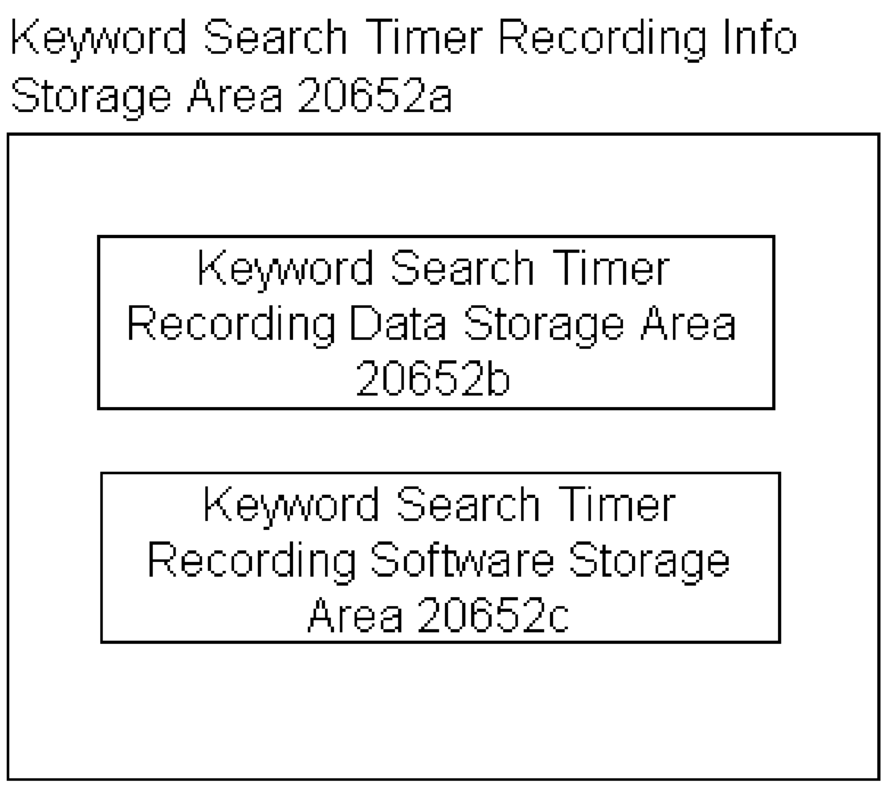

Fig. 1203
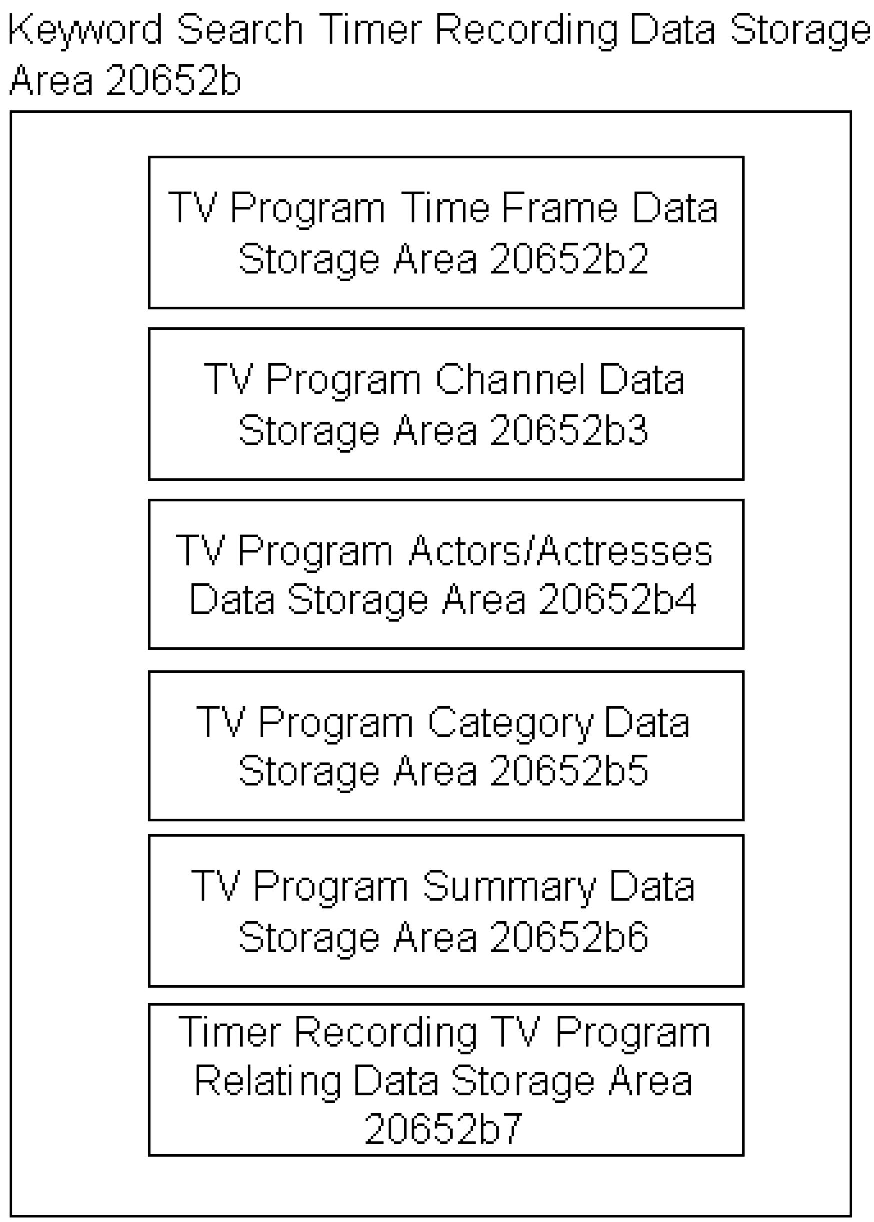

Fig. 1204

TV Program Time Frame Data Storage Area 20652b2

| TV Program ID | TV Program Time Frame Data #1 | TV Program Time Frame Data #2 |
|---|---|---|
| TV Program #1 | 19:00 - 19:30 | 20:30 - 21:00 |
| TV Program #2 | 19:30 - 20:30 | Null |
| TV Program #3 | 21:30 - 22:00 | Null |
| TV Program #4 | 21:00 - 22:00 | Null |
| TV Program #5 | 19:00 - 20:00 | 20:30 - 21:30 |
| TV Program #6 | 20:00 - 20:30 | Null |

Fig. 1205

TV Program Time Frame Data Storage Area 20652b2

| TV Program ID | TV Program Time Frame Data #1 | Re-run Flag Data |
|---|---|---|
| TV Program #1 | 19:00 - 19:30 | 0 |
| TV Program #2 | 19:30 - 20:30 | 0 |
| TV Program #3 | 21:30 - 22:00 | 0 |
| TV Program #4 | 21:00 - 22:00 | 0 |
| TV Program #5 | 19:00 - 20:00 | 0 |
| TV Program #6 | 20:00 - 20:30 | 0 |
| TV Program #1 | 20:30 - 21:00 | 1 |
| TV Program #5 | 20:30 - 21:30 | 1 |

Fig. 1206

TV Program Channel Data Storage Area 20652b3

| TV Program ID | TV Program Channel Data |
|---|---|
| TV Program #1 | Ch 1 |
| TV Program #2 | Ch 1 |
| TV Program #3 | Ch 2 |
| TV Program #4 | Ch 1 |
| TV Program #5 | Ch 2 |
| TV Program #6 | Ch 2 |

Fig. 1207
LCD 201
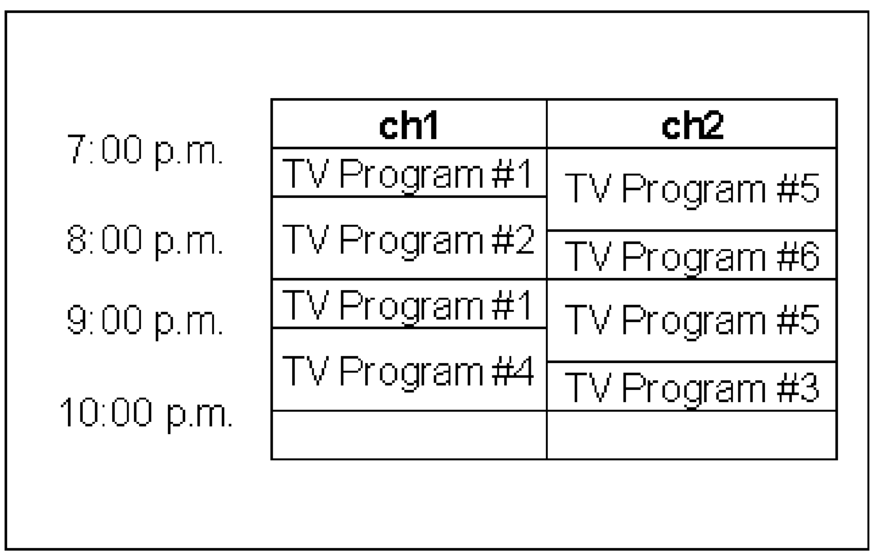

Fig. 1208

TV Program Actors/Actresses Data Storage Area 20652b4

| TV Program ID | Actors/Actresses Data |
|---|---|
| TV Program #1 | Actor #1, Actress #2 |
| TV Program #2 | Actor #3, Actress #3, Actress #4 |
| TV Program #3 | Actress #5, Actress #6 |
| TV Program #4 | Actor #7, Actor #8 |
| TV Program #5 | Actress #9 |
| TV Program #6 | Actor #10, Actor #11, Actress #12 |

Fig. 1209

TV Program Category Data Storage Area 20652b5

| TV Program ID | Category Data |
|---|---|
| TV Program #1 | Science Fiction |
| TV Program #2 | Situation Comedy |
| TV Program #3 | News |
| TV Program #4 | Documentary |
| TV Program #5 | Science Fiction |
| TV Program #6 | Situation Comedy |

Fig. 1210

TV Program Summary Data Storage Area 20652b6

| TV Program ID | Summary Data |
|---|---|
| TV Program #1 | Summary #1 |
| TV Program #2 | Summary #2 |
| TV Program #3 | Summary #3 |
| TV Program #4 | Summary #4 |
| TV Program #5 | Summary #5 |
| TV Program #6 | Summary #6 |

Fig. 1211

Timer Recording TV Program Relating Data Storage Area 20652b7

User #1

| TV Program ID | TV Program Channel Data | TV Program Time Frame Data #1 | Record Completed Flag Data | TV Program Data |
|---|---|---|---|---|
| | | | | |
| | | | | |

Fig. 1212

Keyword Search Timer Recording Software Storage Area 20652c

Keyword Search Timer Recording Data Request Sending Software 20652c1

Keyword Search Timer Recording Data Receiving Software 20652c3

Timer Recording Setting By Actors/Actresses Software 20652c4

Timer Recording Setting By Category Software 20652c5

Re-run Avoiding Process Software 20652c6

Timer Recording Software 20652c7

Timer Recording Notification Displaying Software 20652c8

TV Program Data Selecting Software 20652c10

TV Program Data Replaying Software 20652c11

Fig. 1213
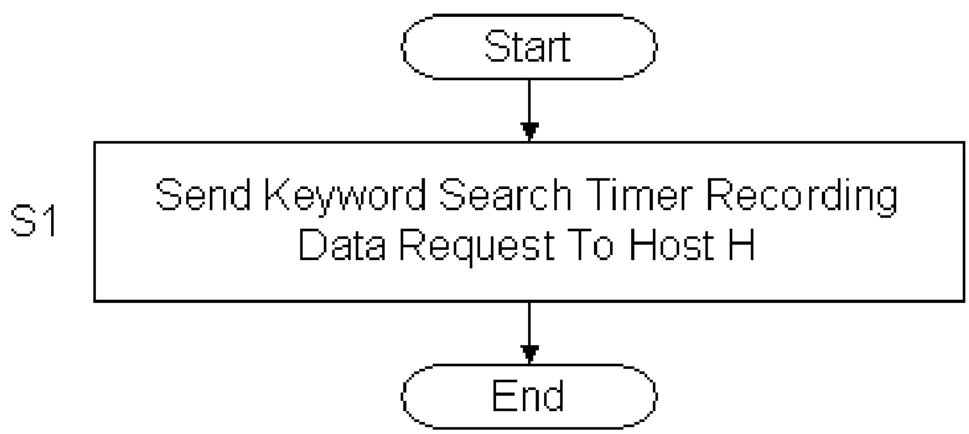

Fig. 1214
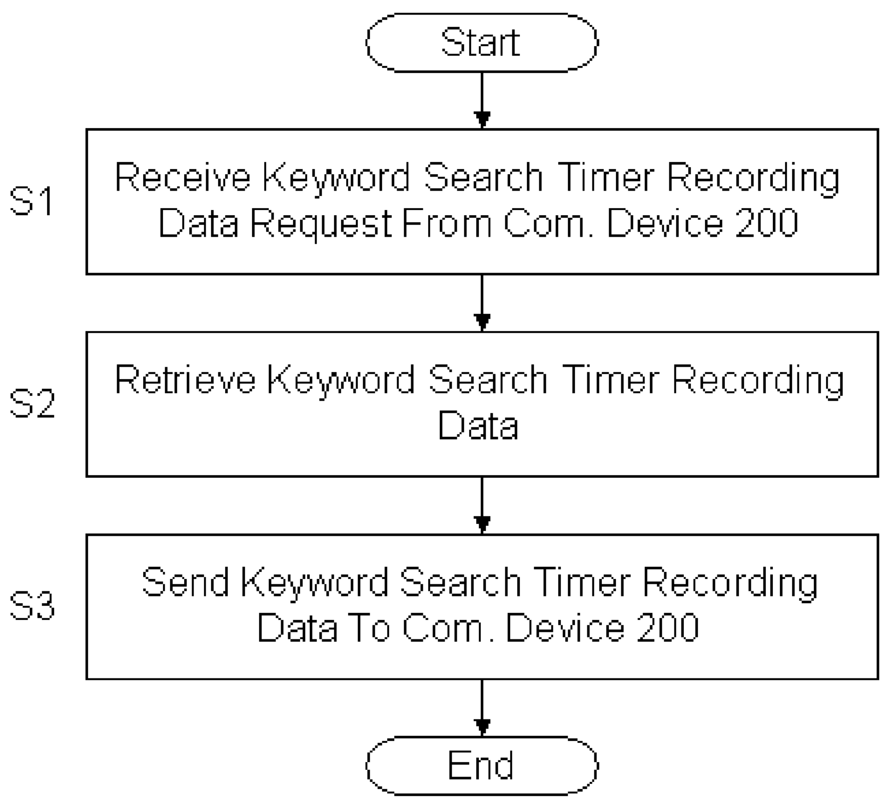

Fig. 1215
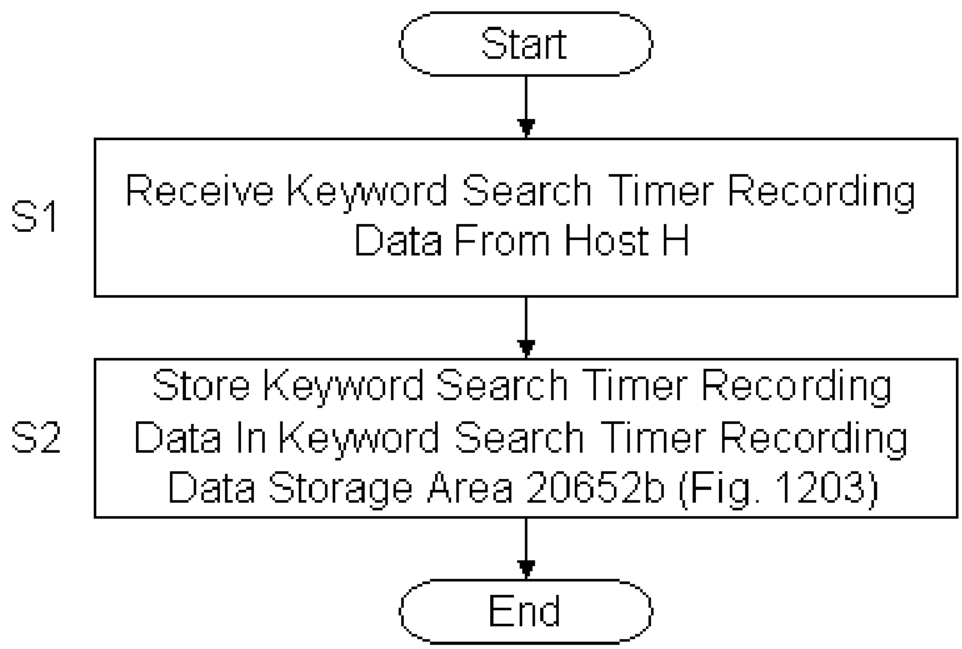

Fig. 1216
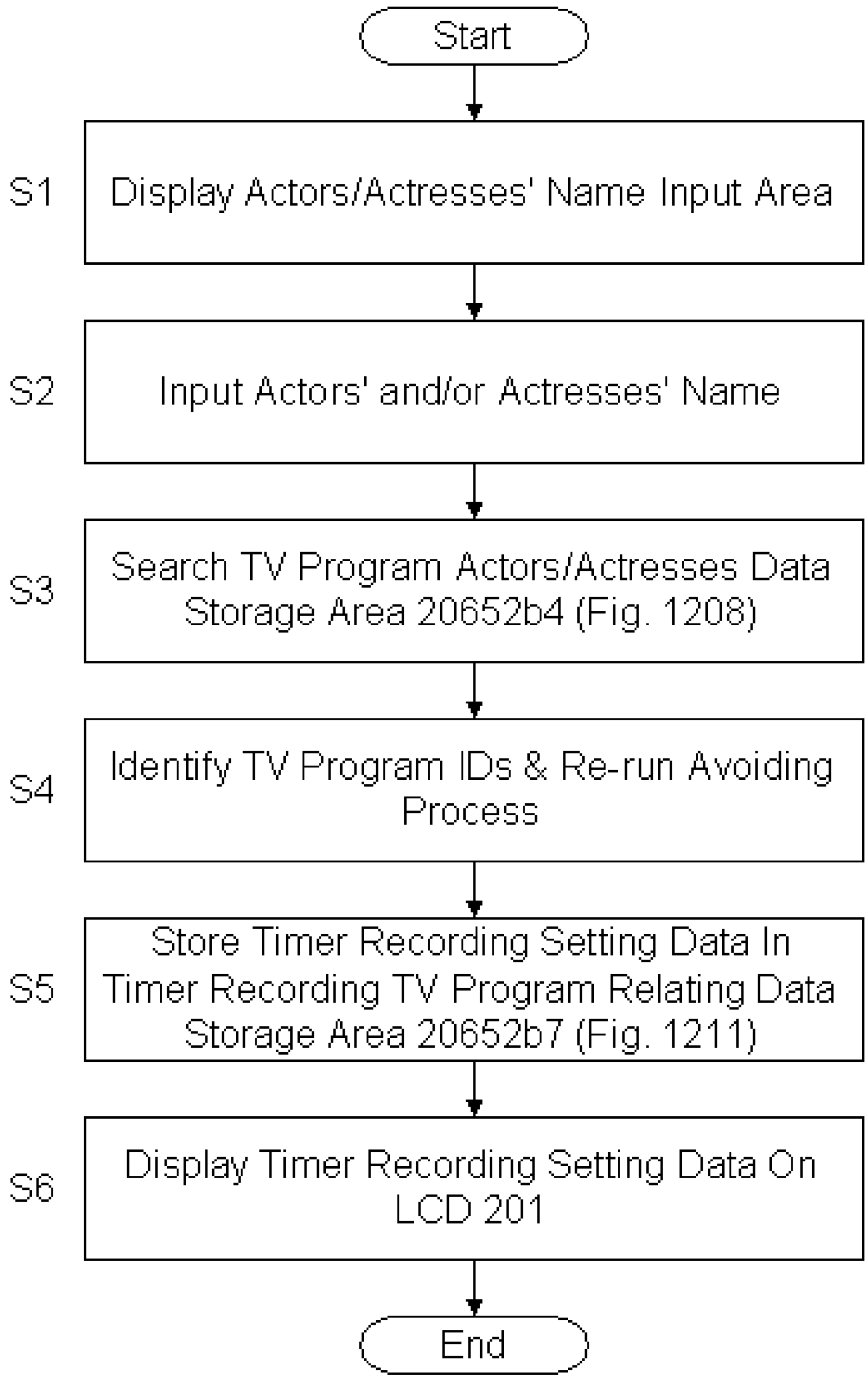

Fig. 1217
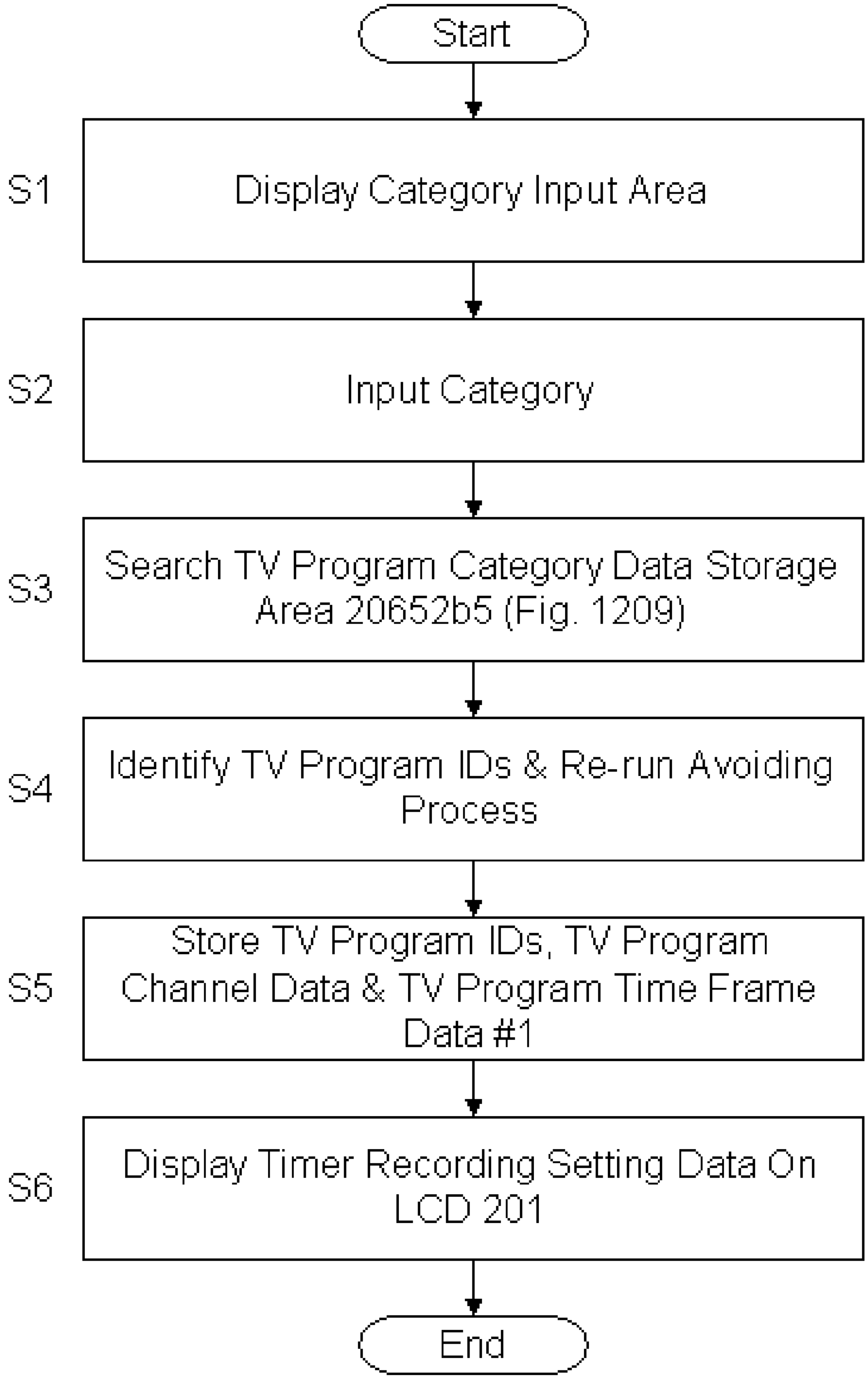

Fig. 1218
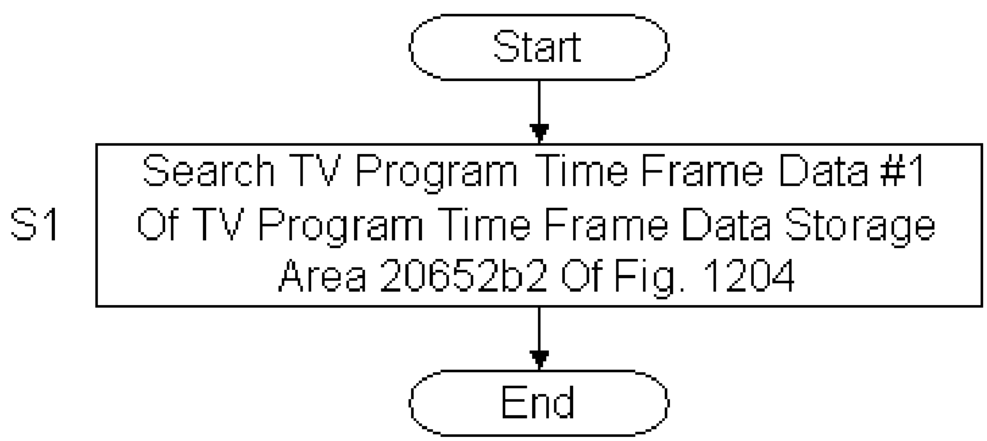

Fig. 1219
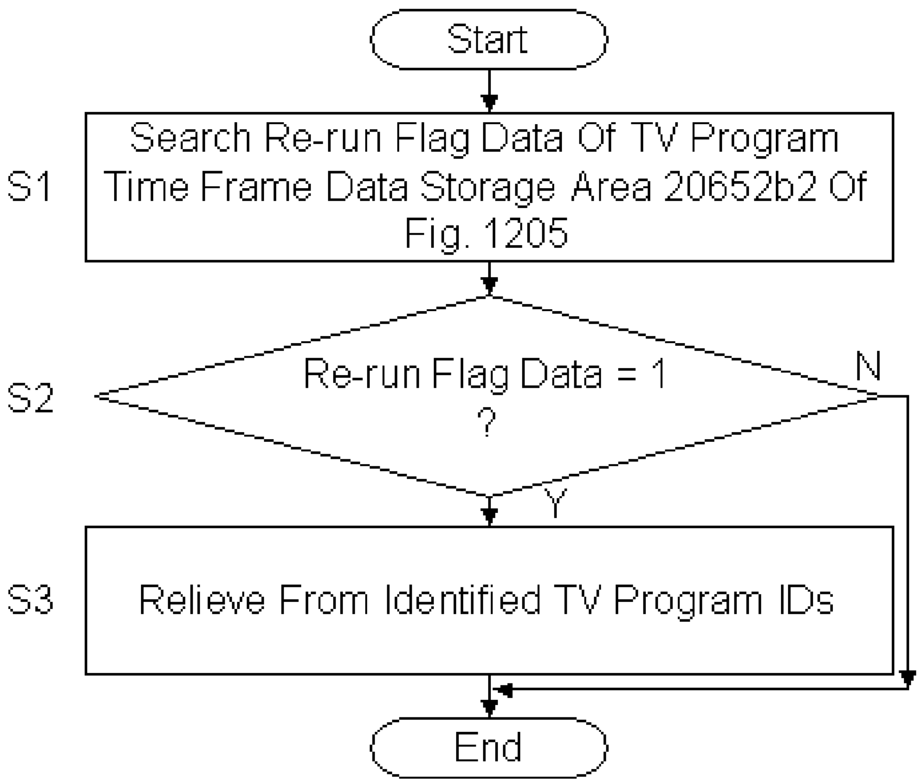

Fig. 1220a
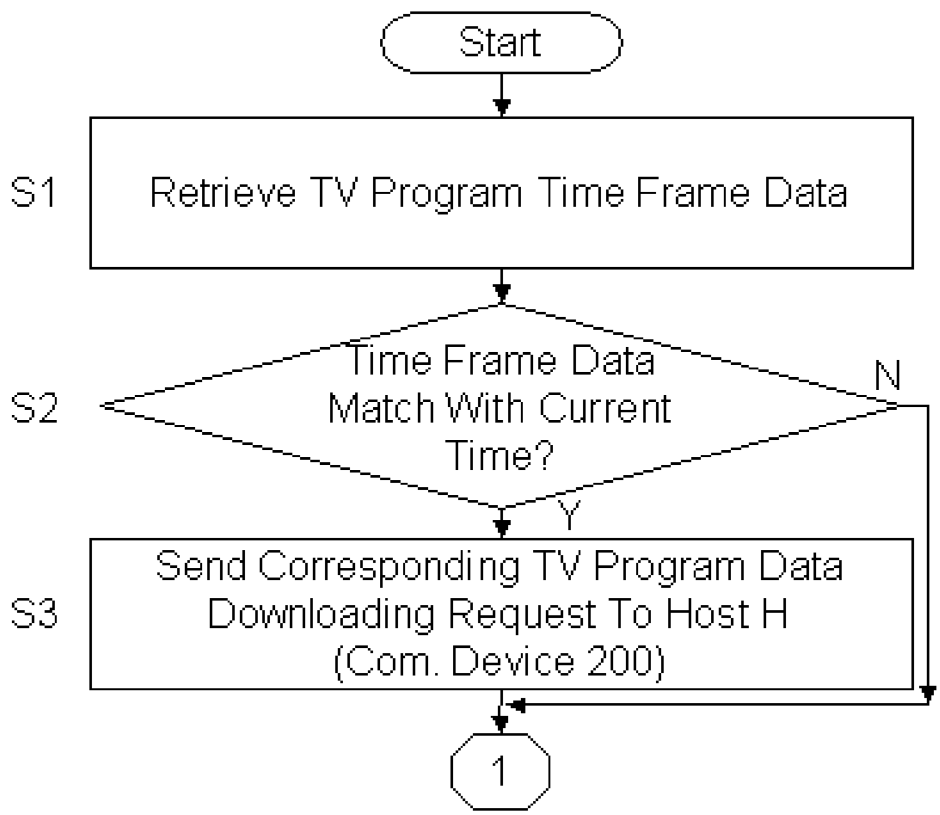

Fig. 1220b
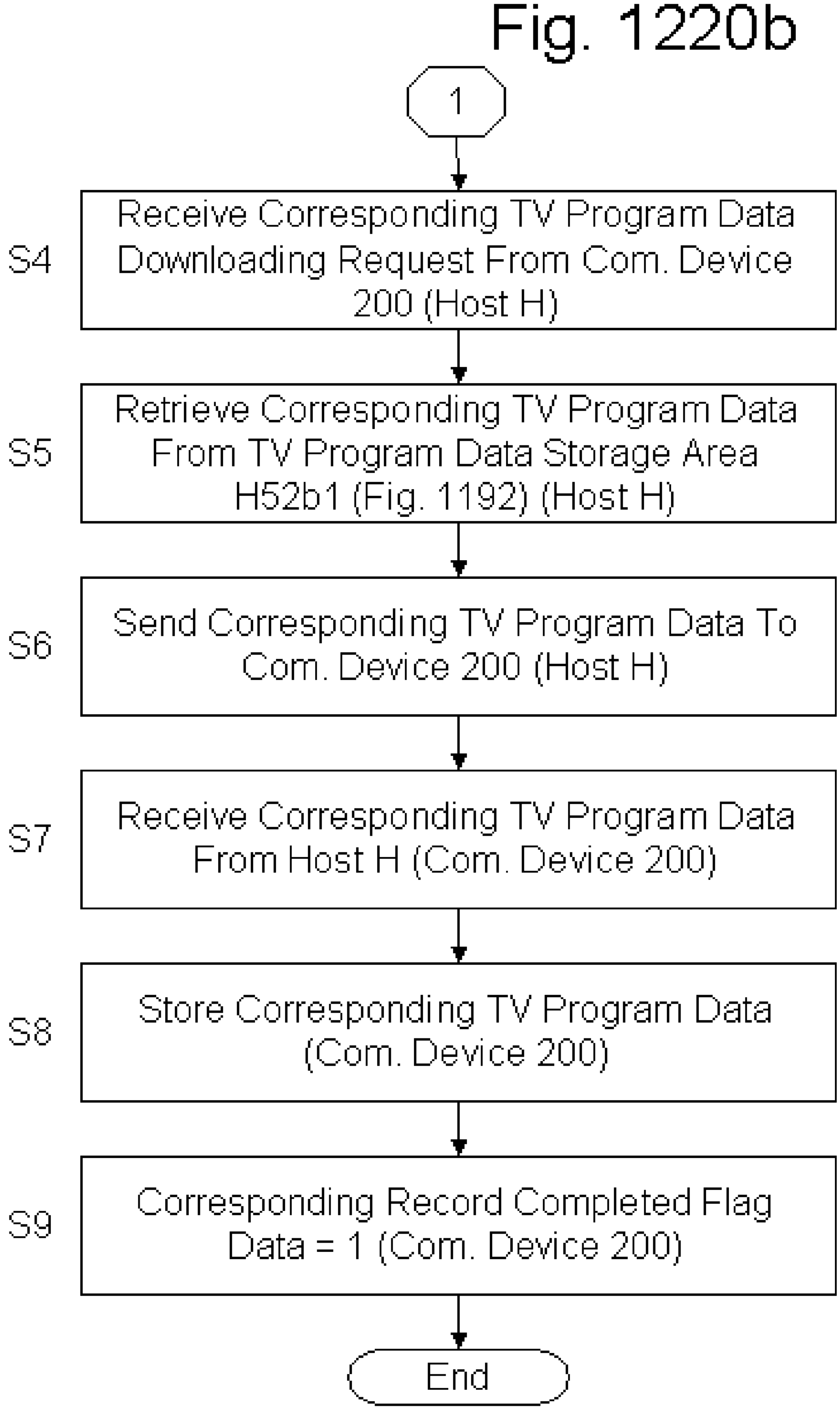

Fig. 1221
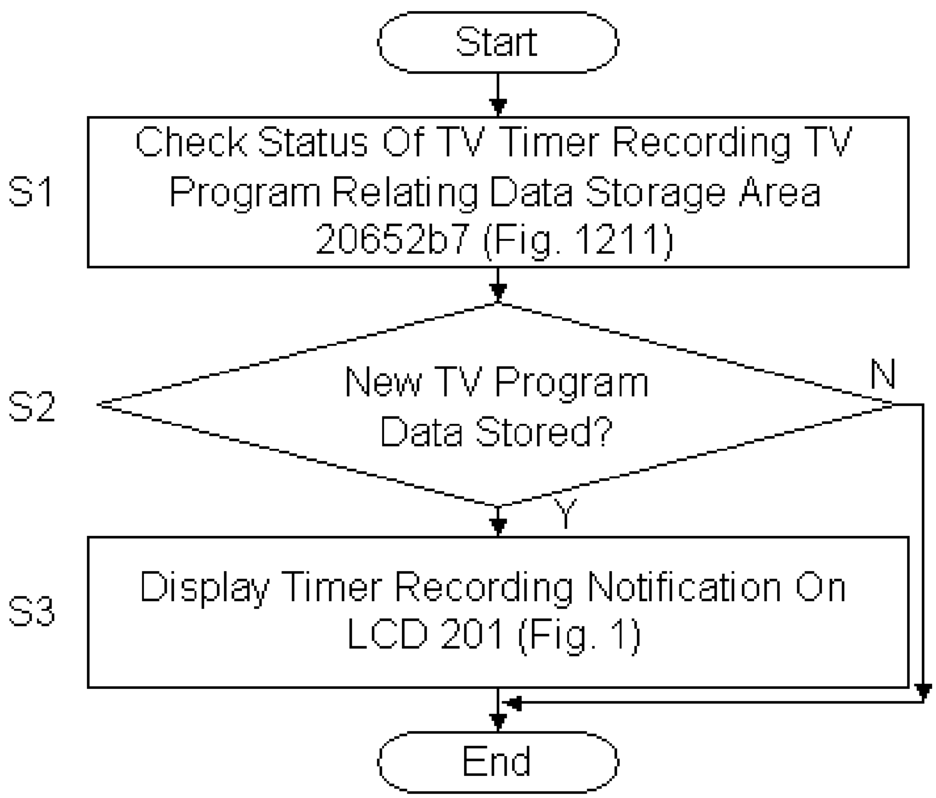

Fig. 1221a
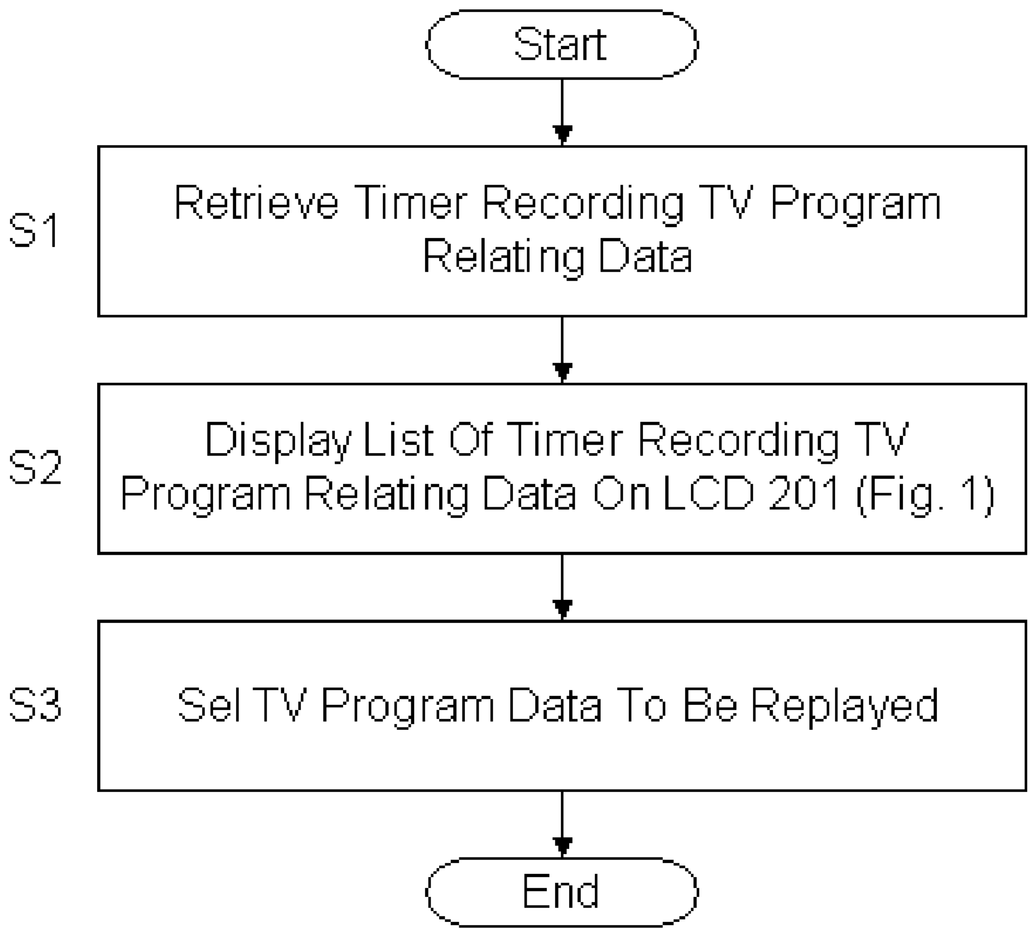

Fig. 1221b
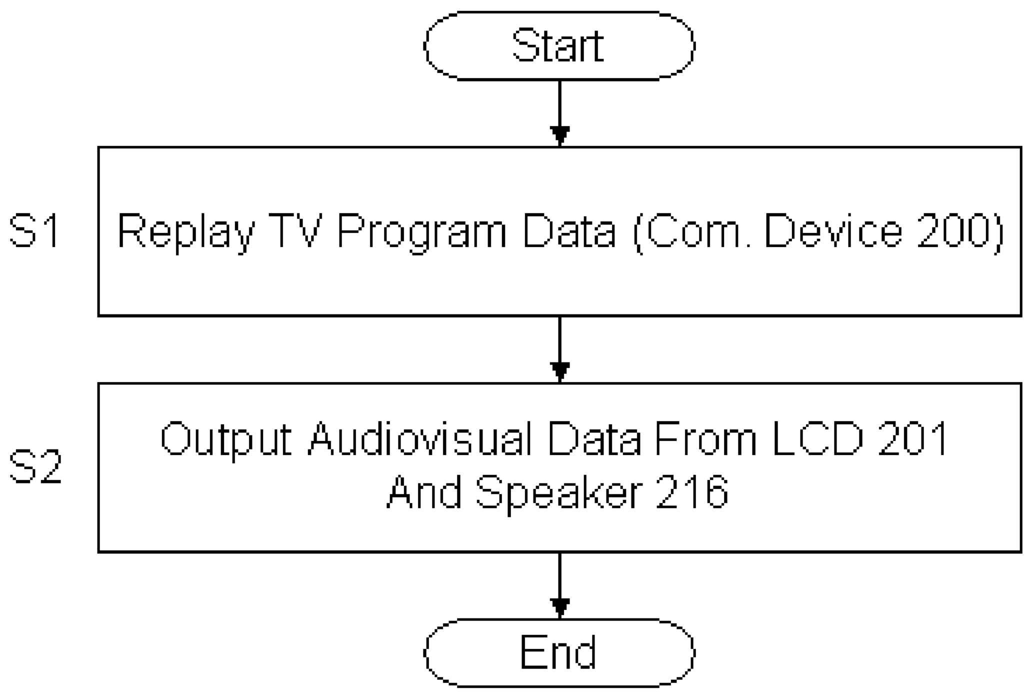

Fig. 1222
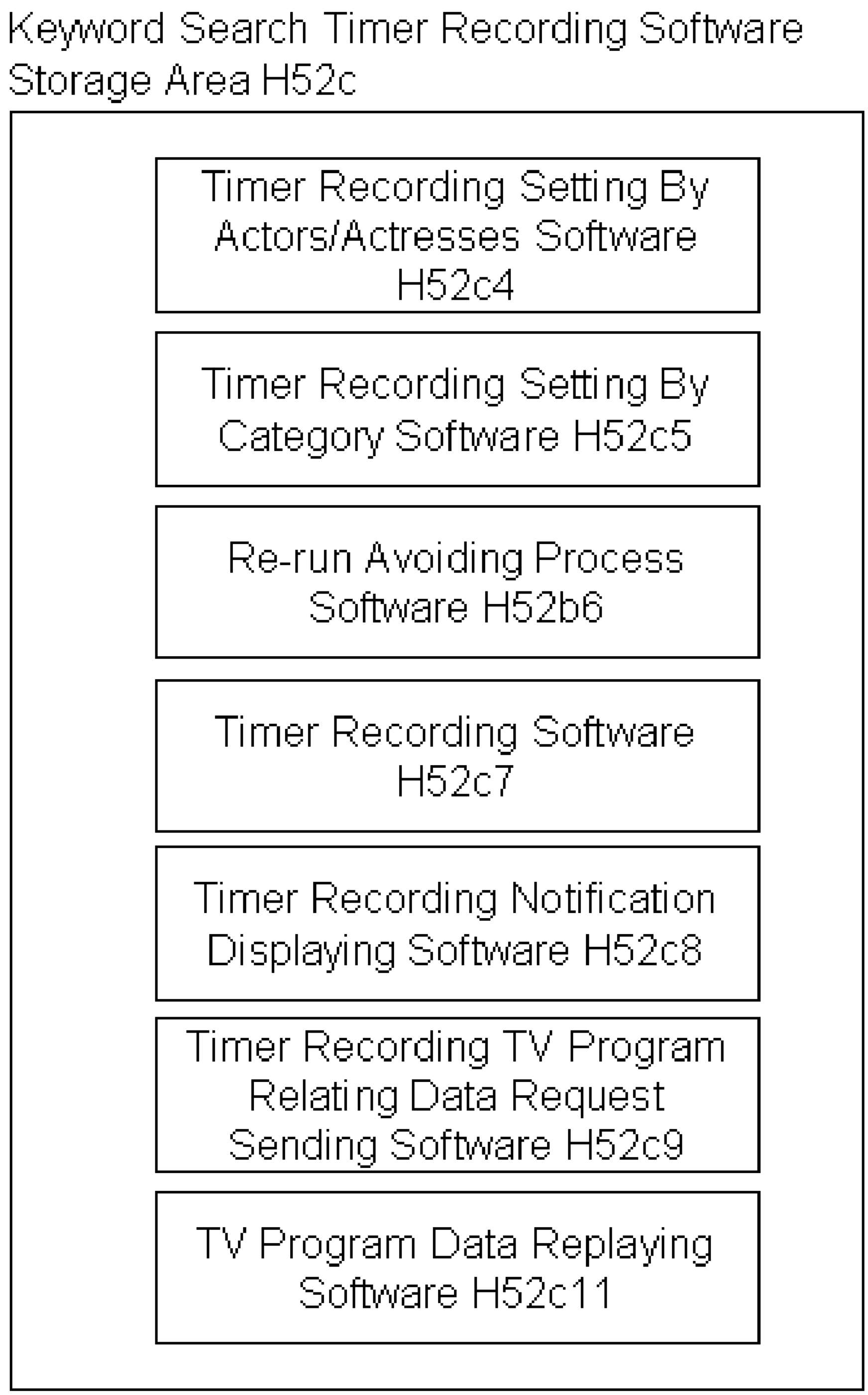

Fig. 1223
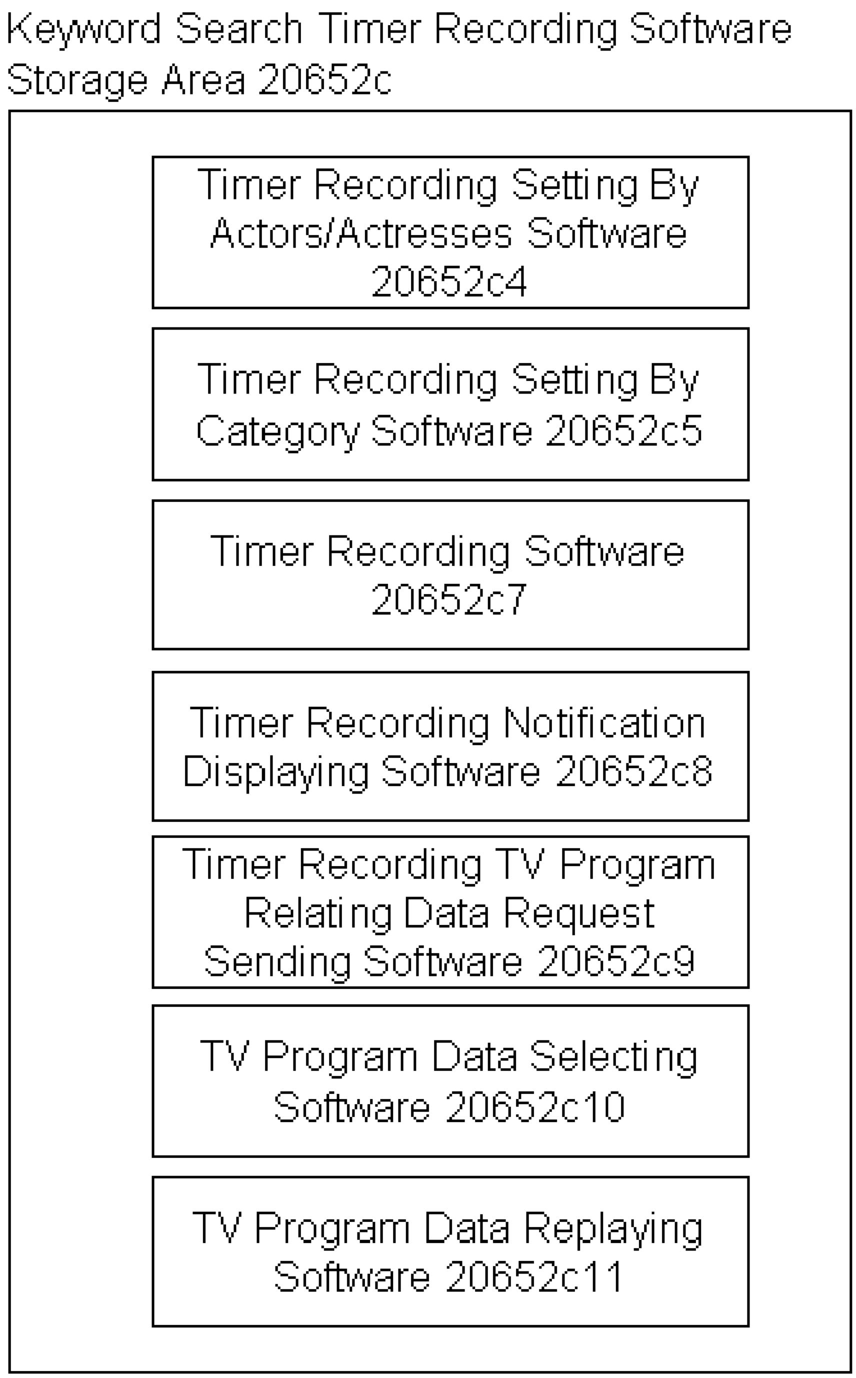

Fig. 1224a
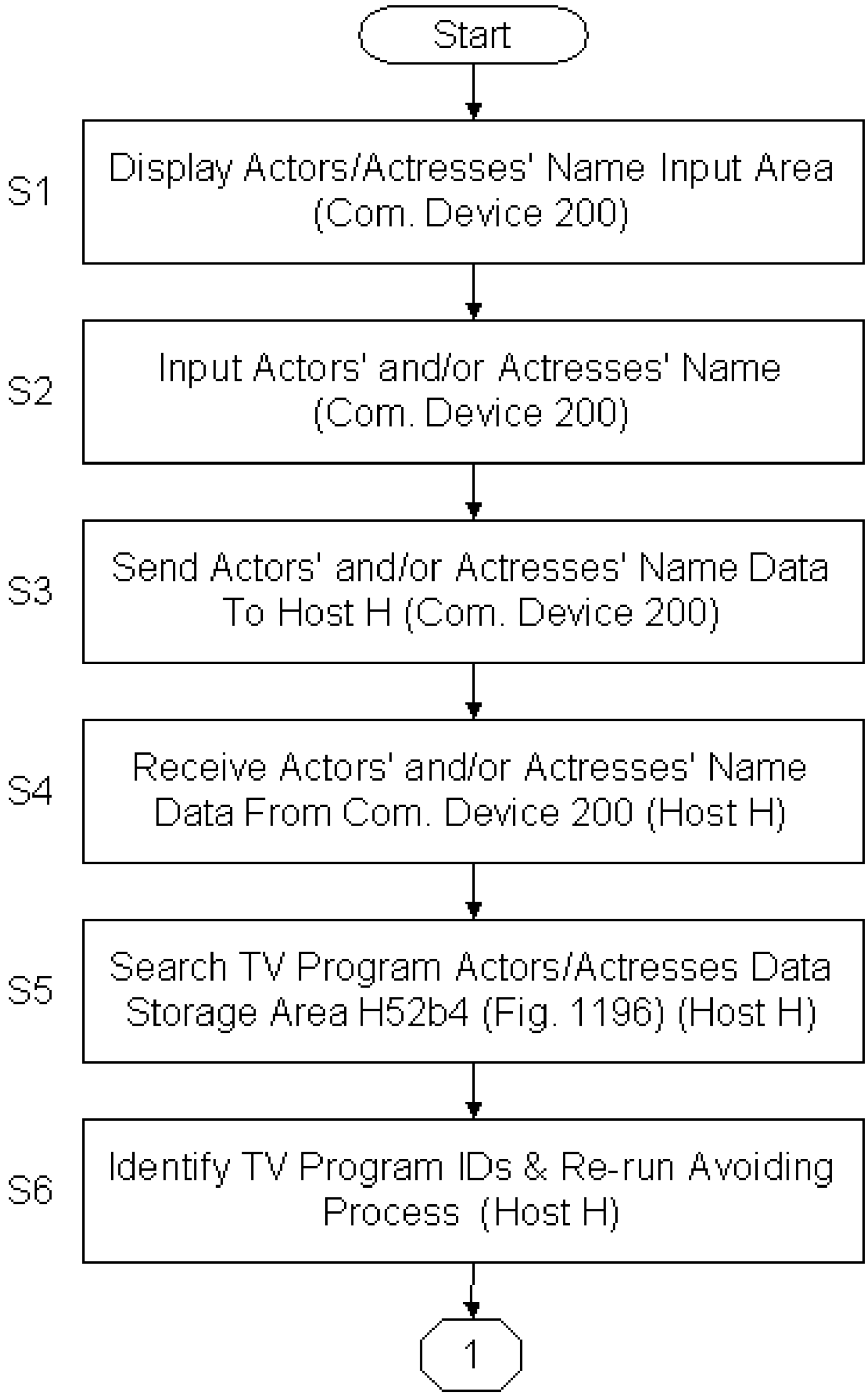

Fig. 1224b
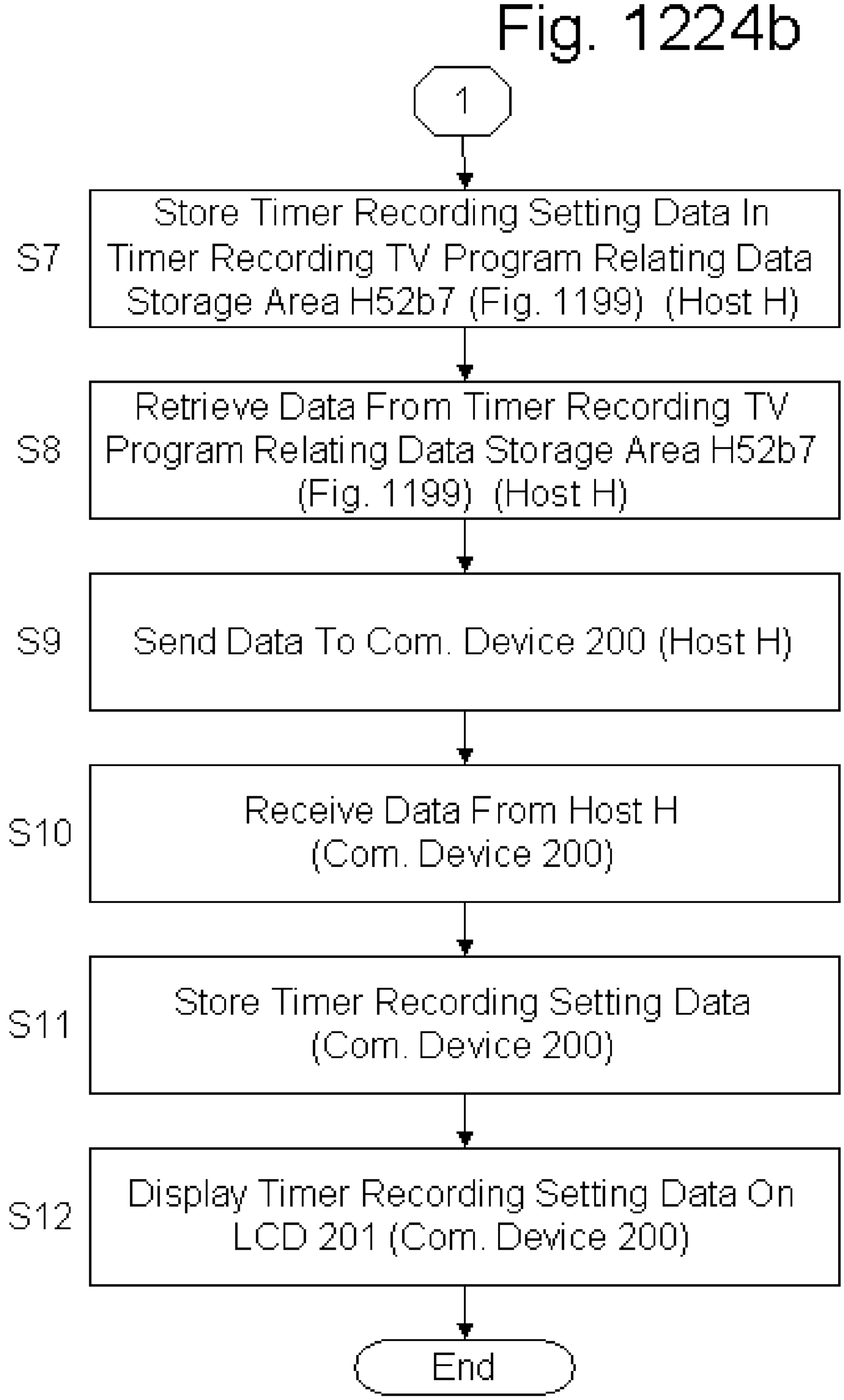

Fig. 1225a
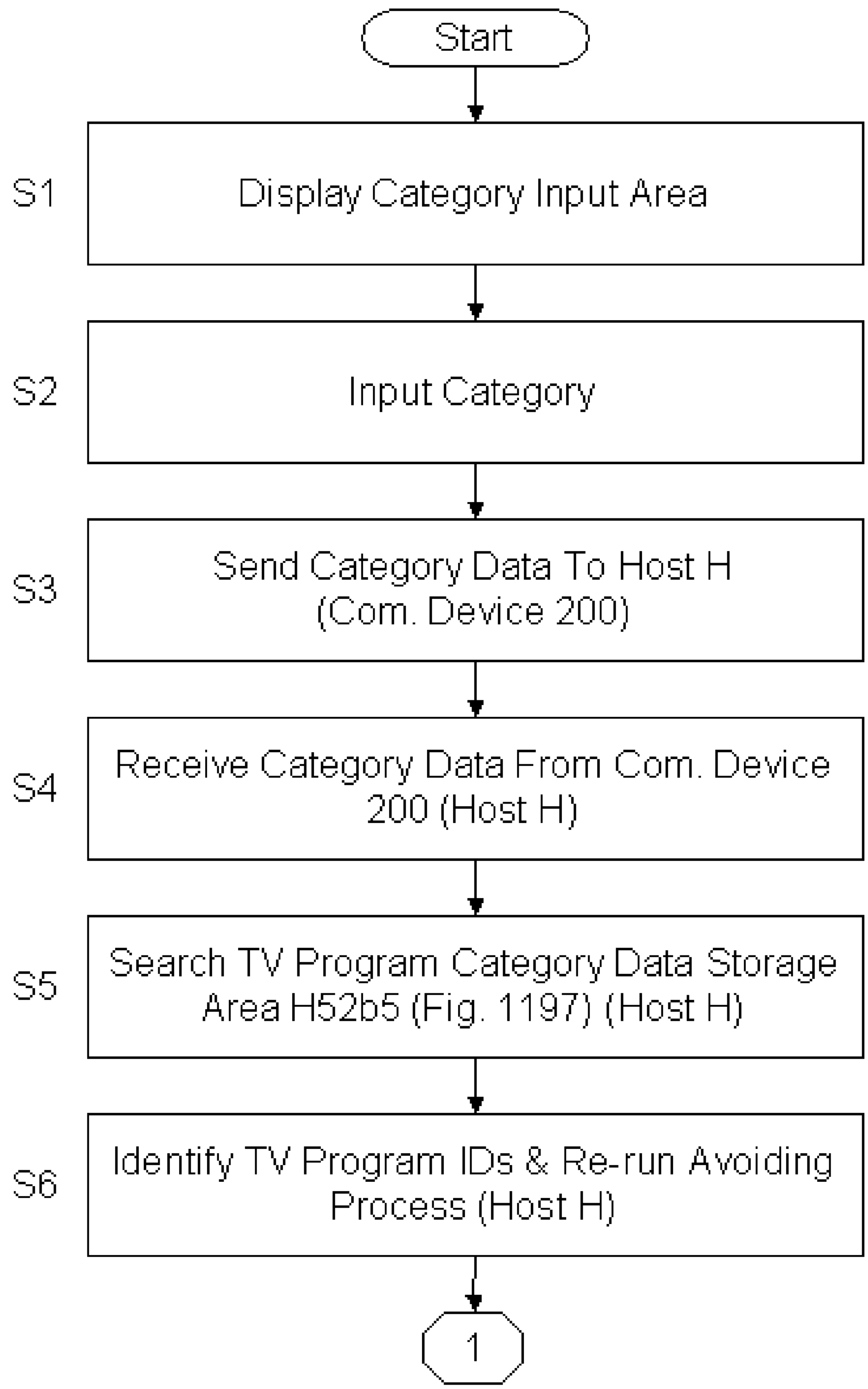

Fig. 1225b
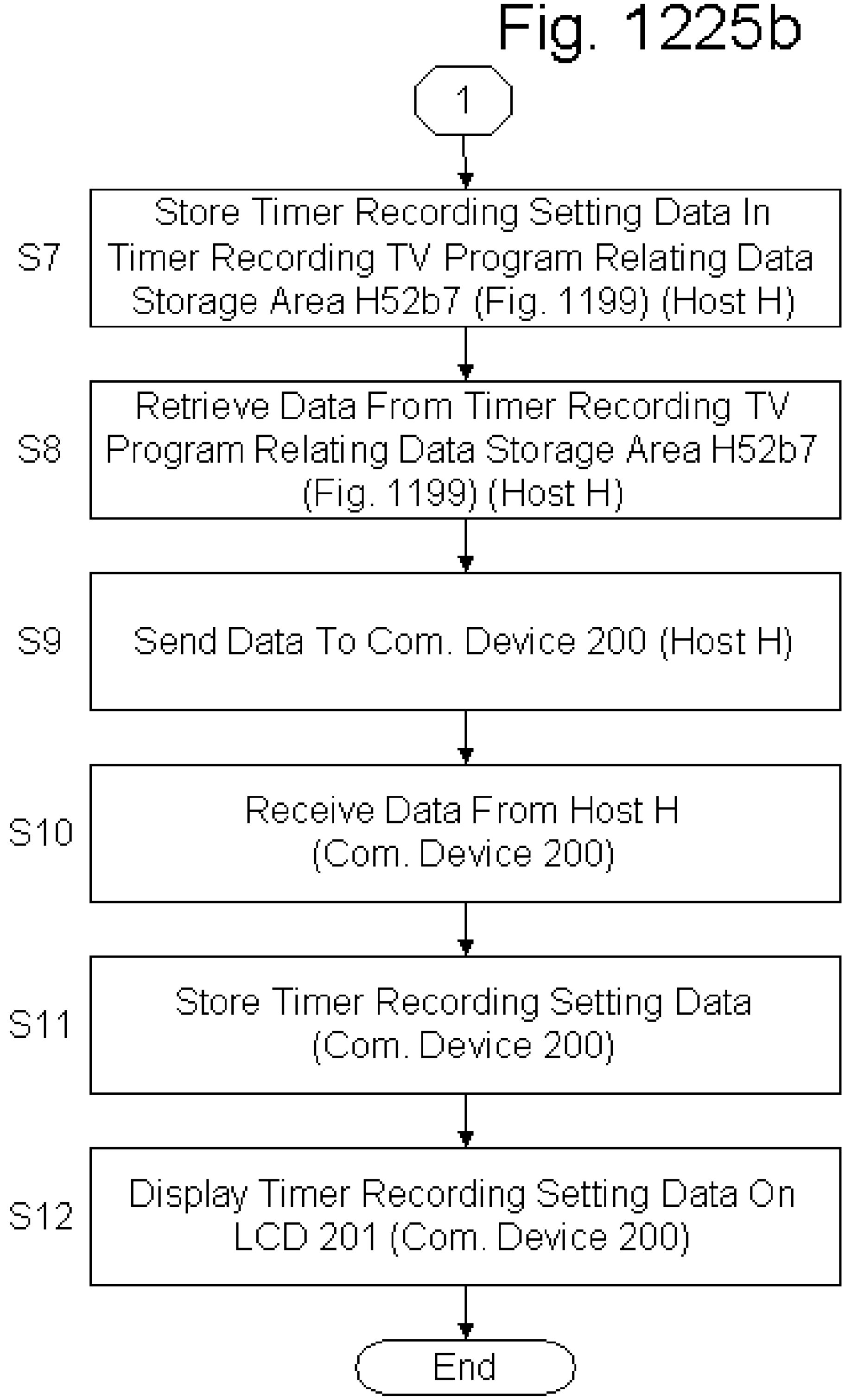

Fig. 1226
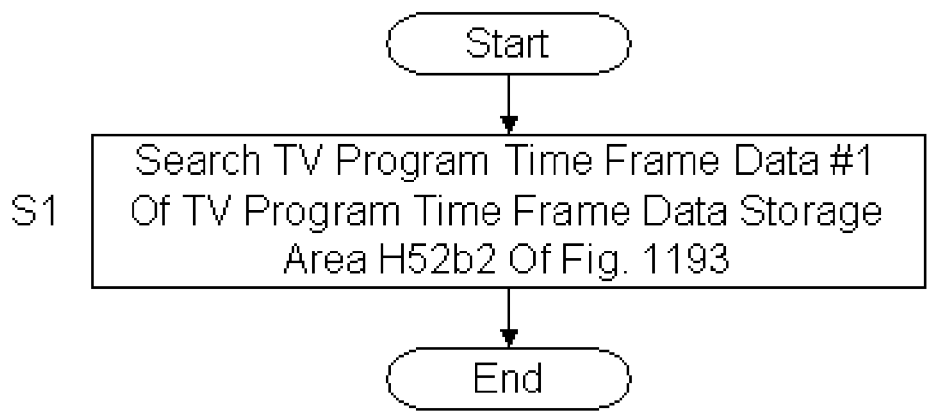

Fig. 1227
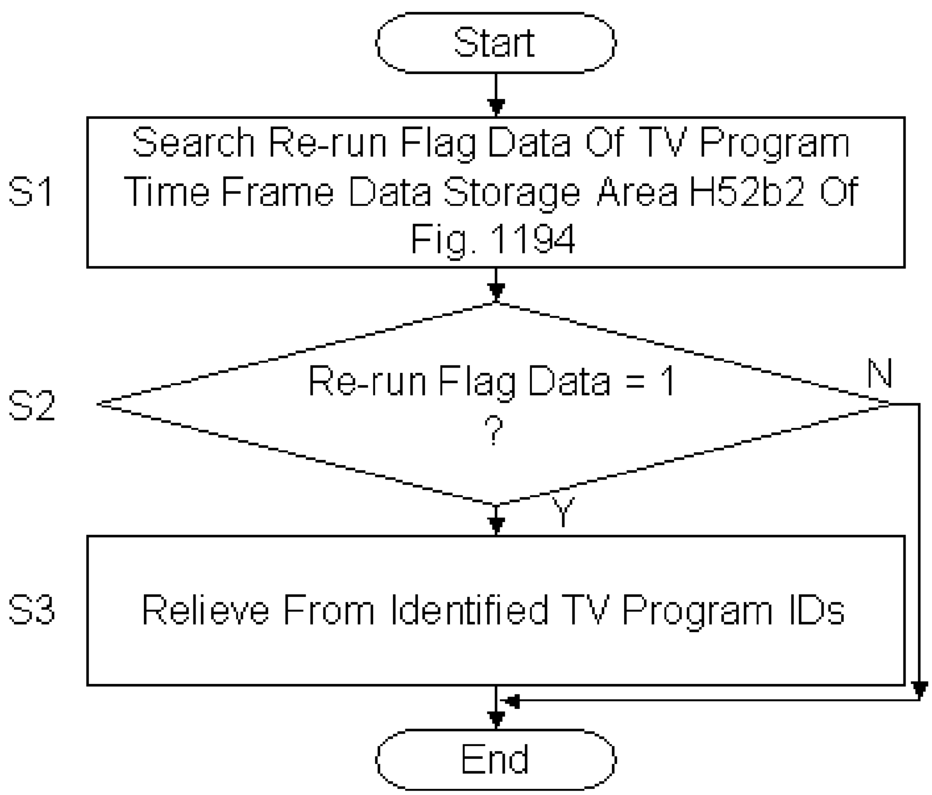

Fig. 1228
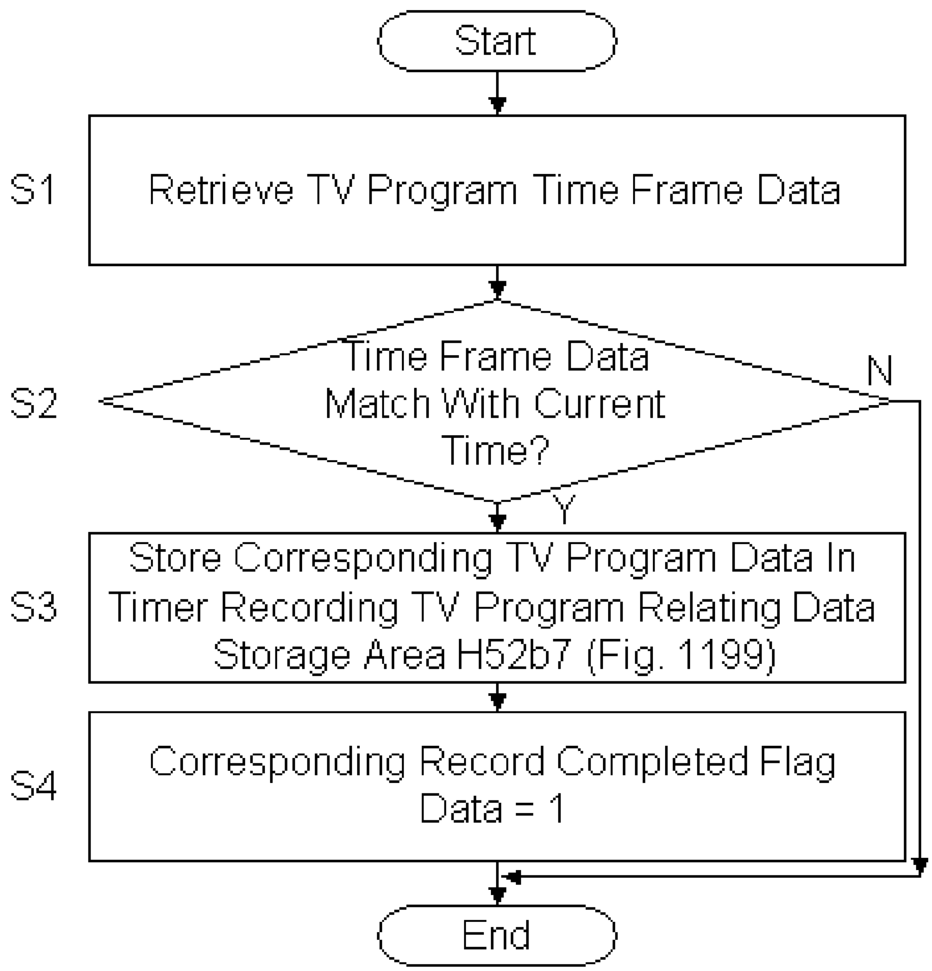

Fig. 1229a
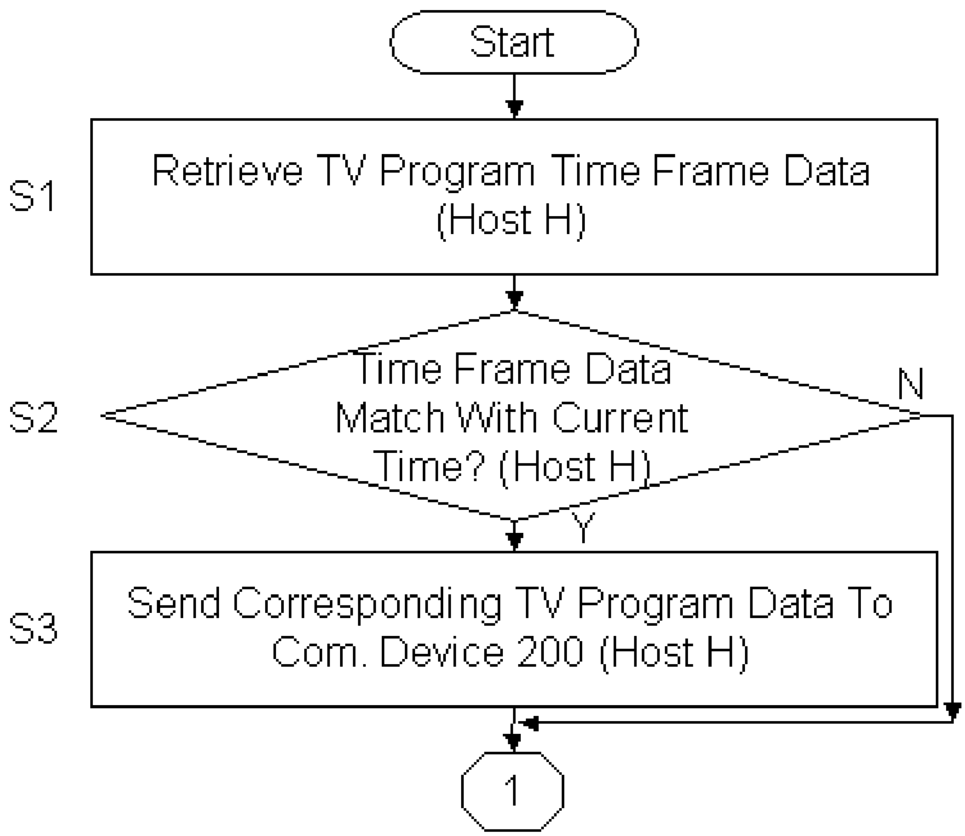

Fig. 1229b
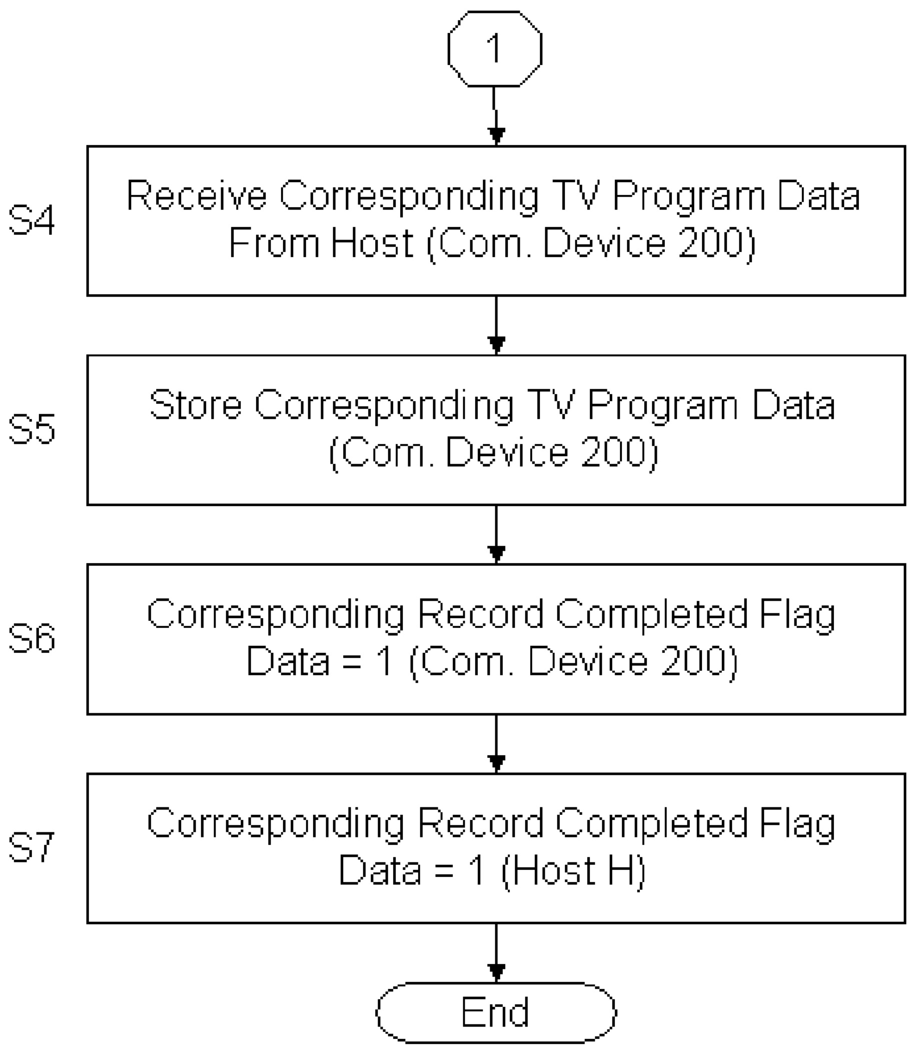

Fig. 1230
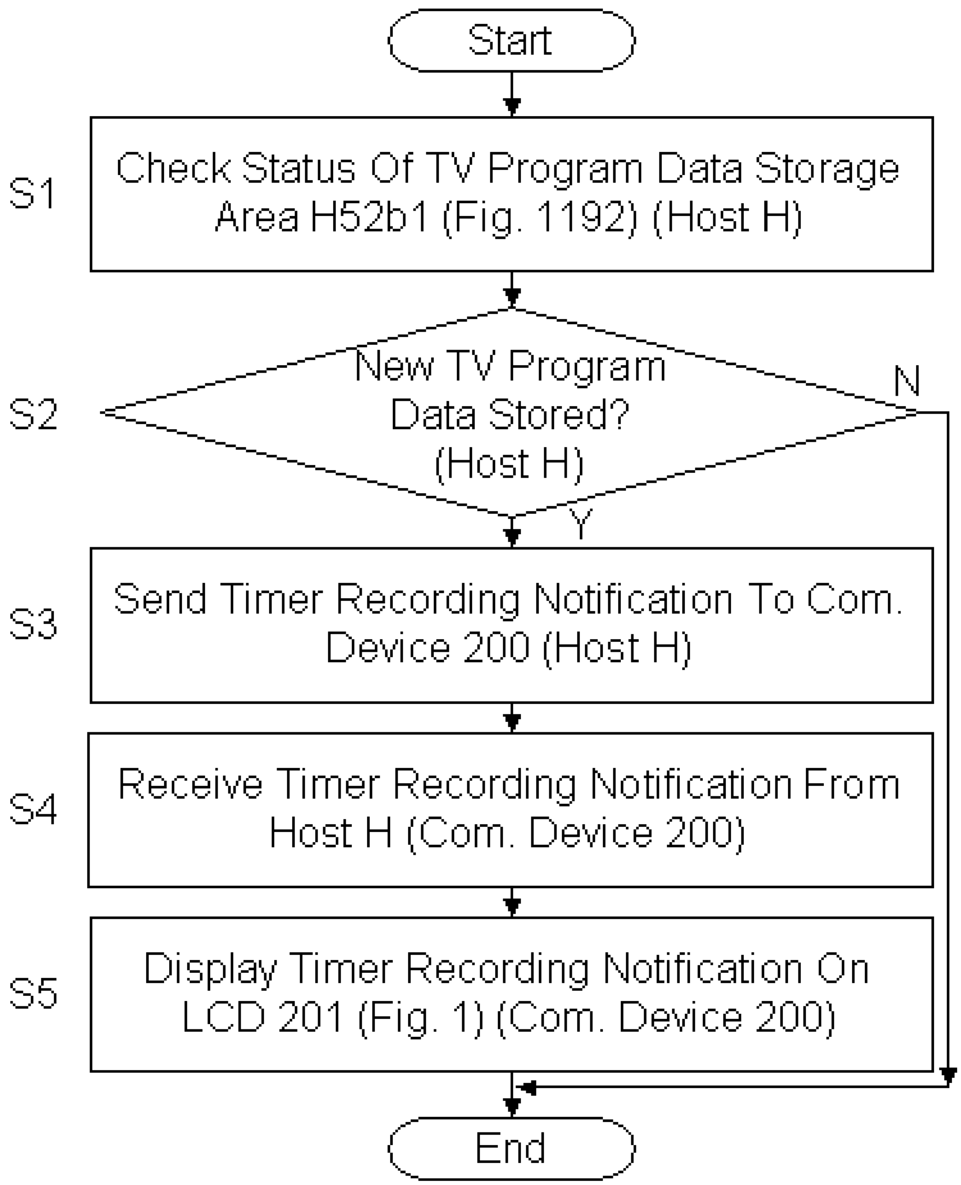

Fig. 1231
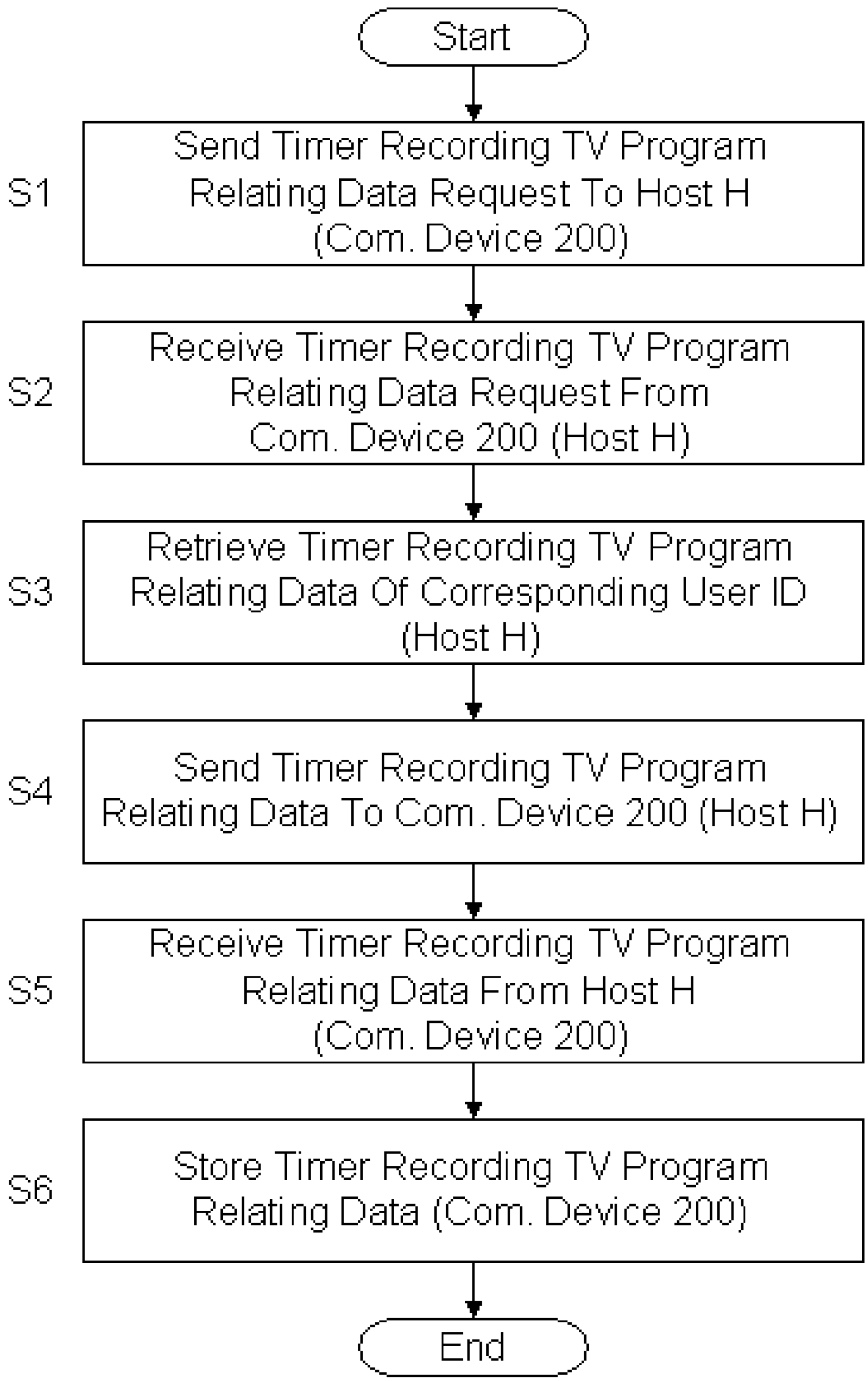

Fig. 1232
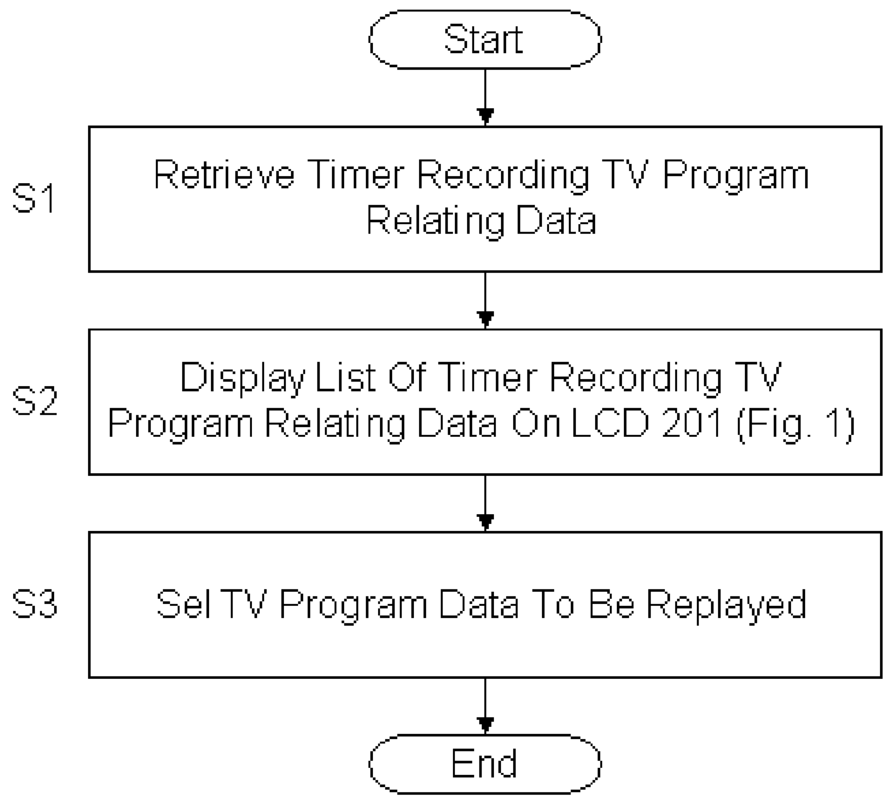

Fig. 1233
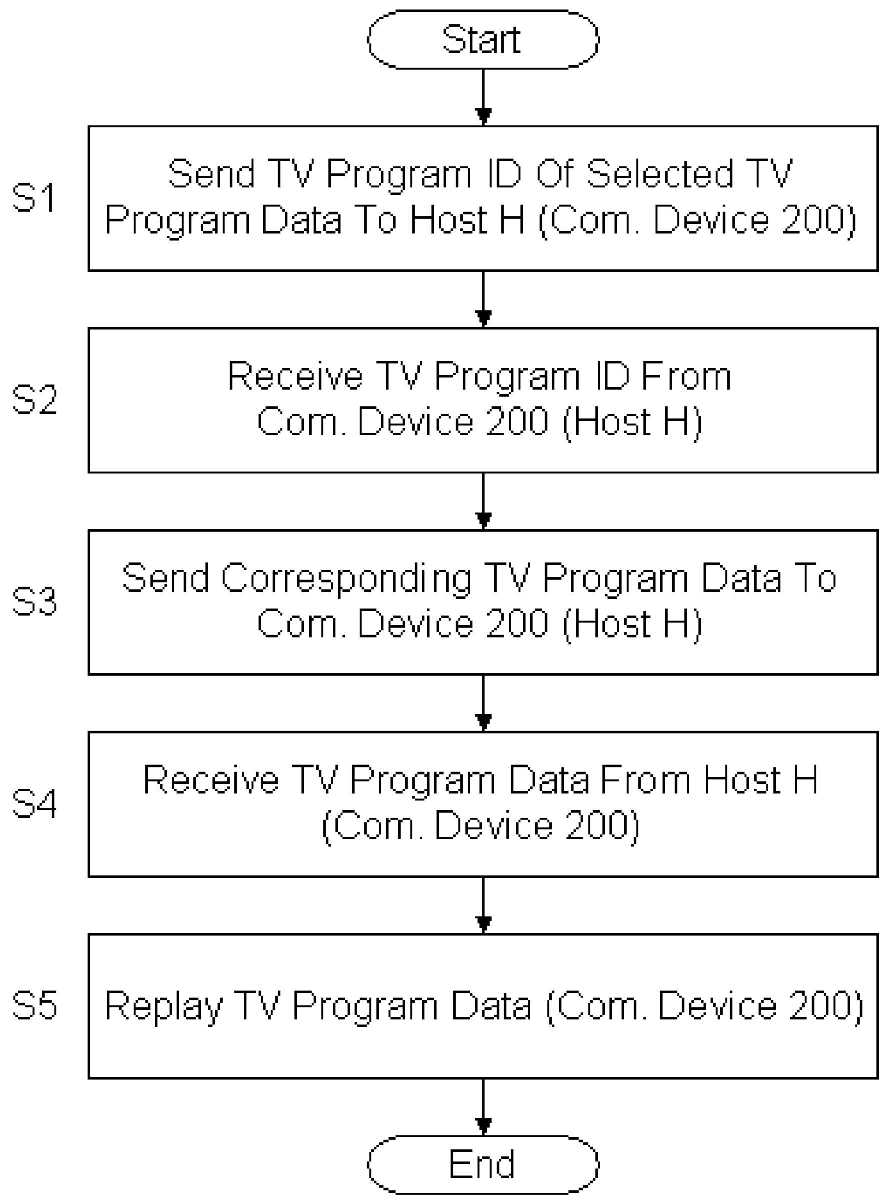

Fig. 1234a
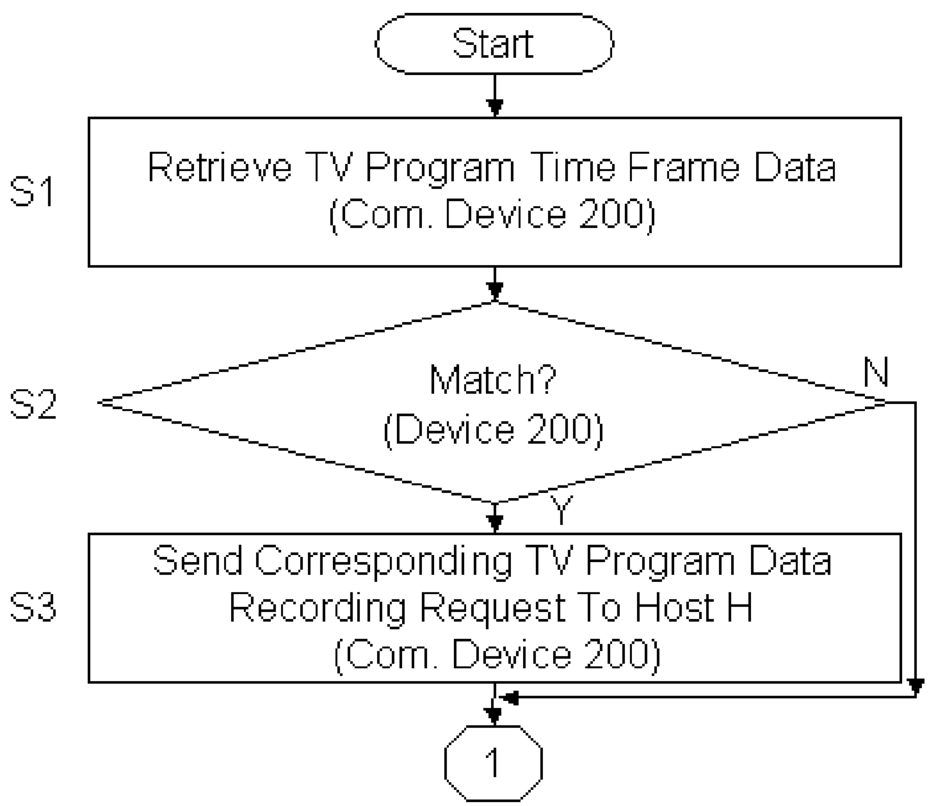

Fig. 1234b
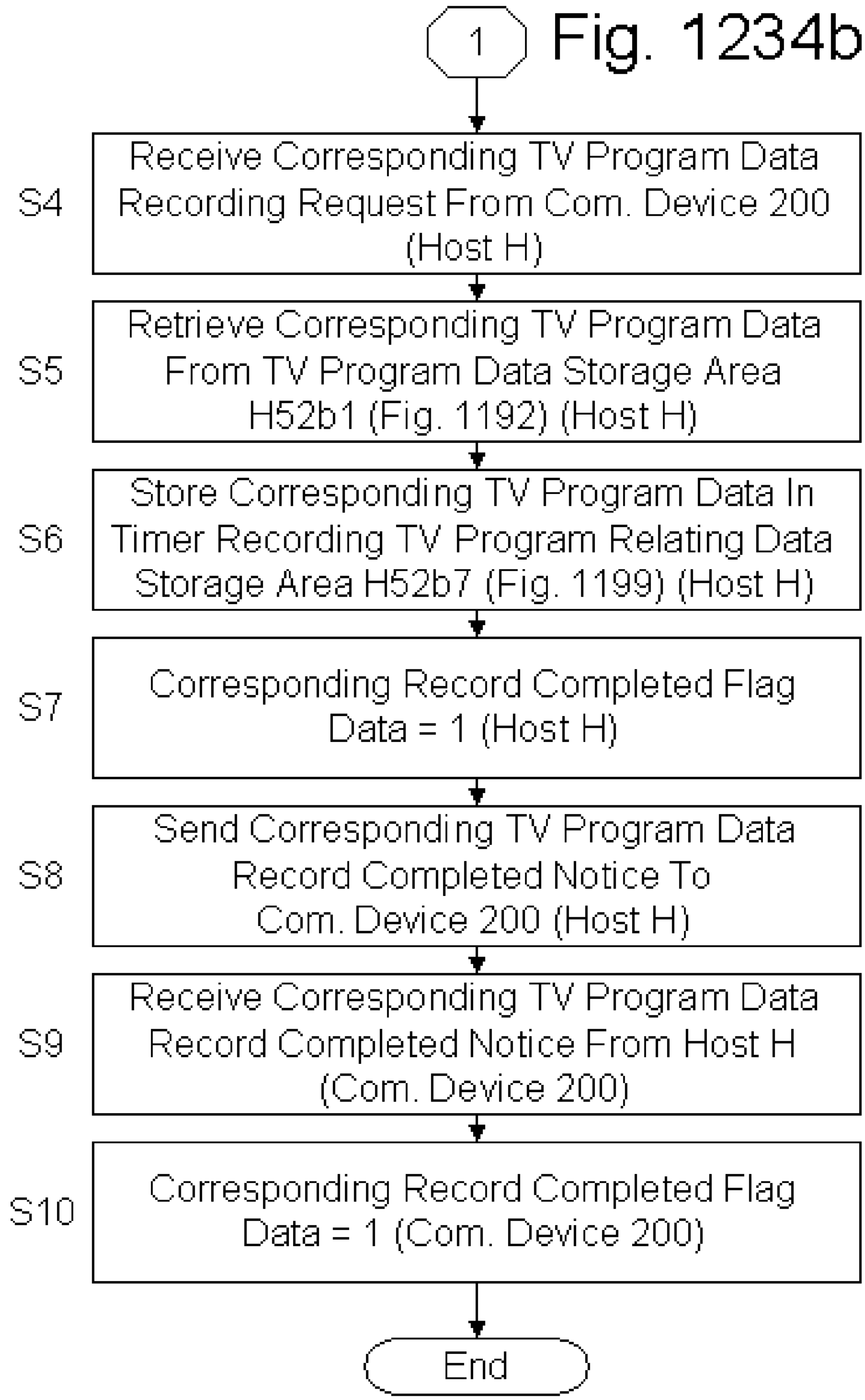

Fig. 1235
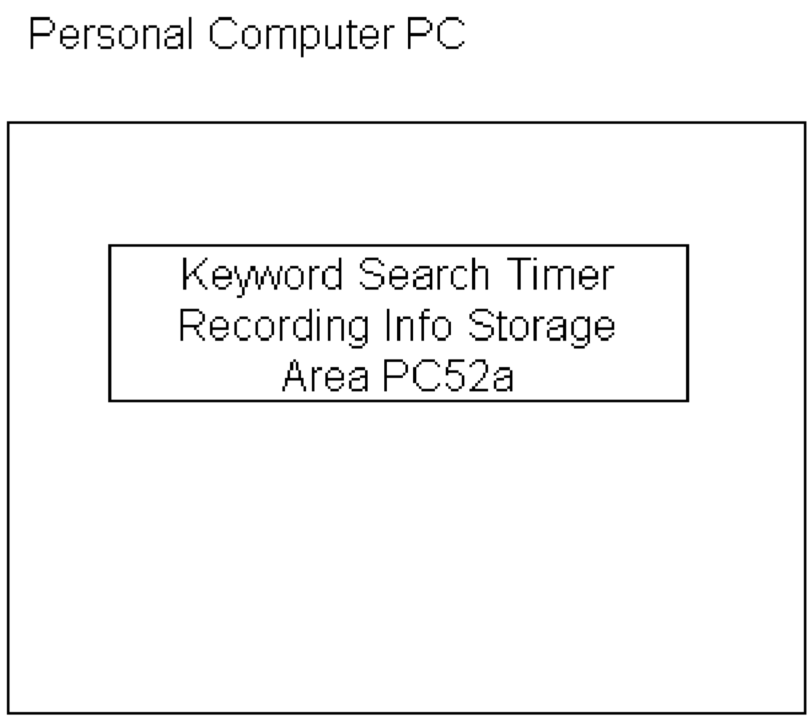

Fig. 1236
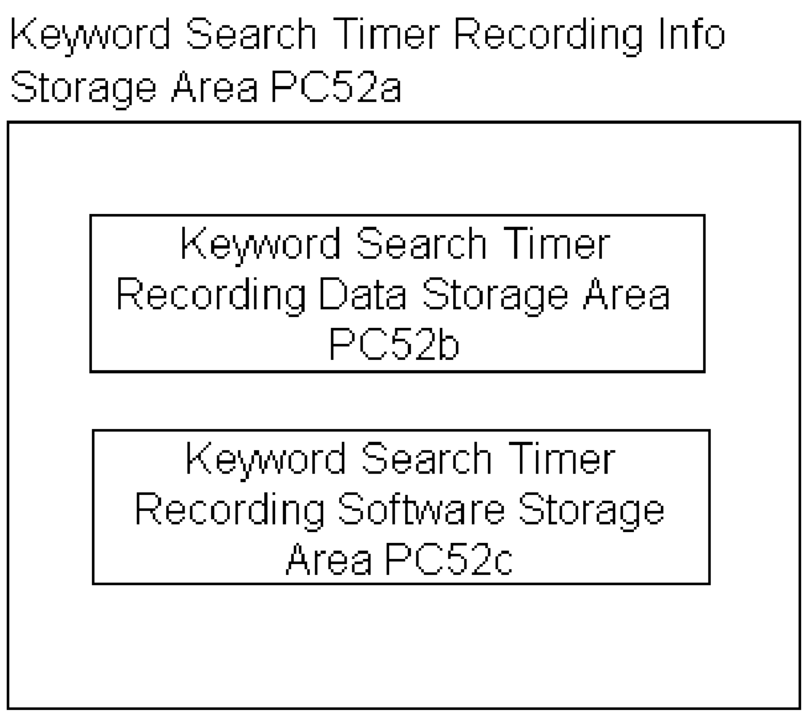

Fig. 1237
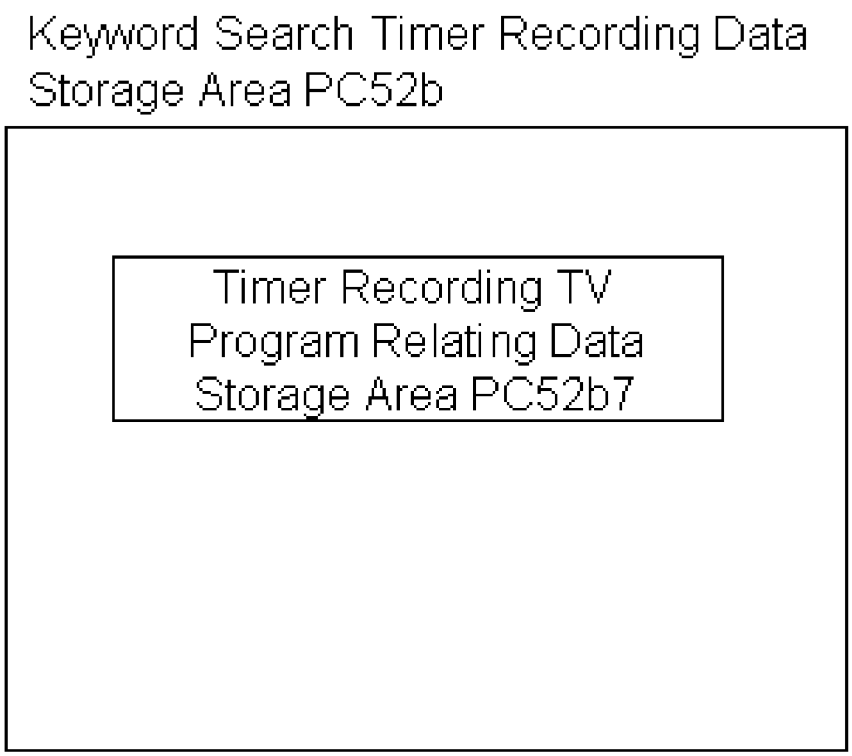

Fig. 1238

Timer Recording TV Program Relating Data Storage Area PC52b7

| TV Program ID | TV Program Channel Data | TV Program Time Frame Data #1 | Record Completed Flag Data | TV Program Data |
|---|---|---|---|---|
| | | | | |
| | | | | |

Fig. 1239
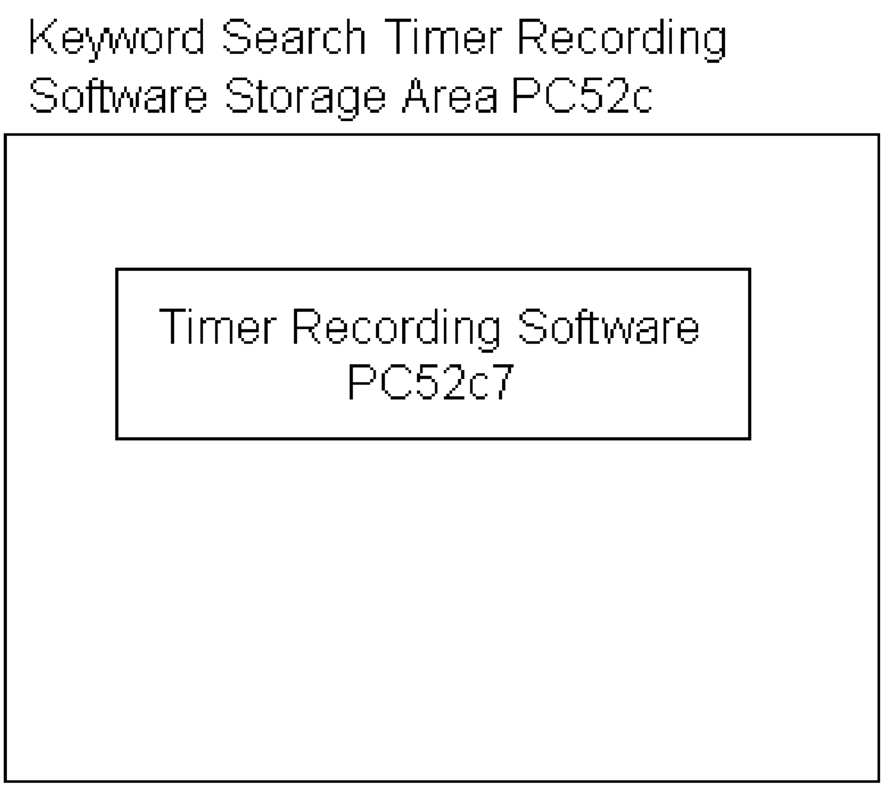

Fig. 1240a
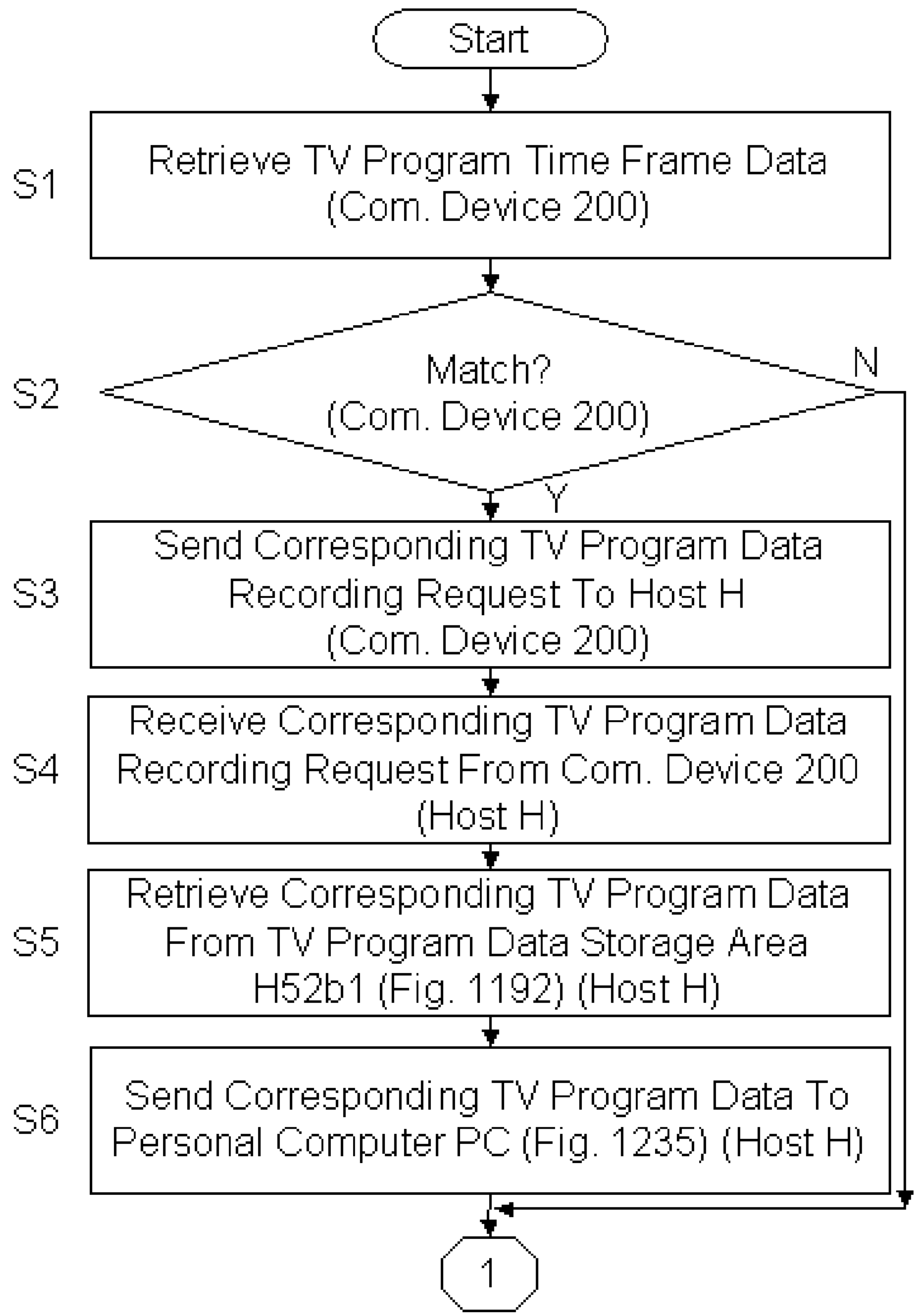

Fig. 1240b
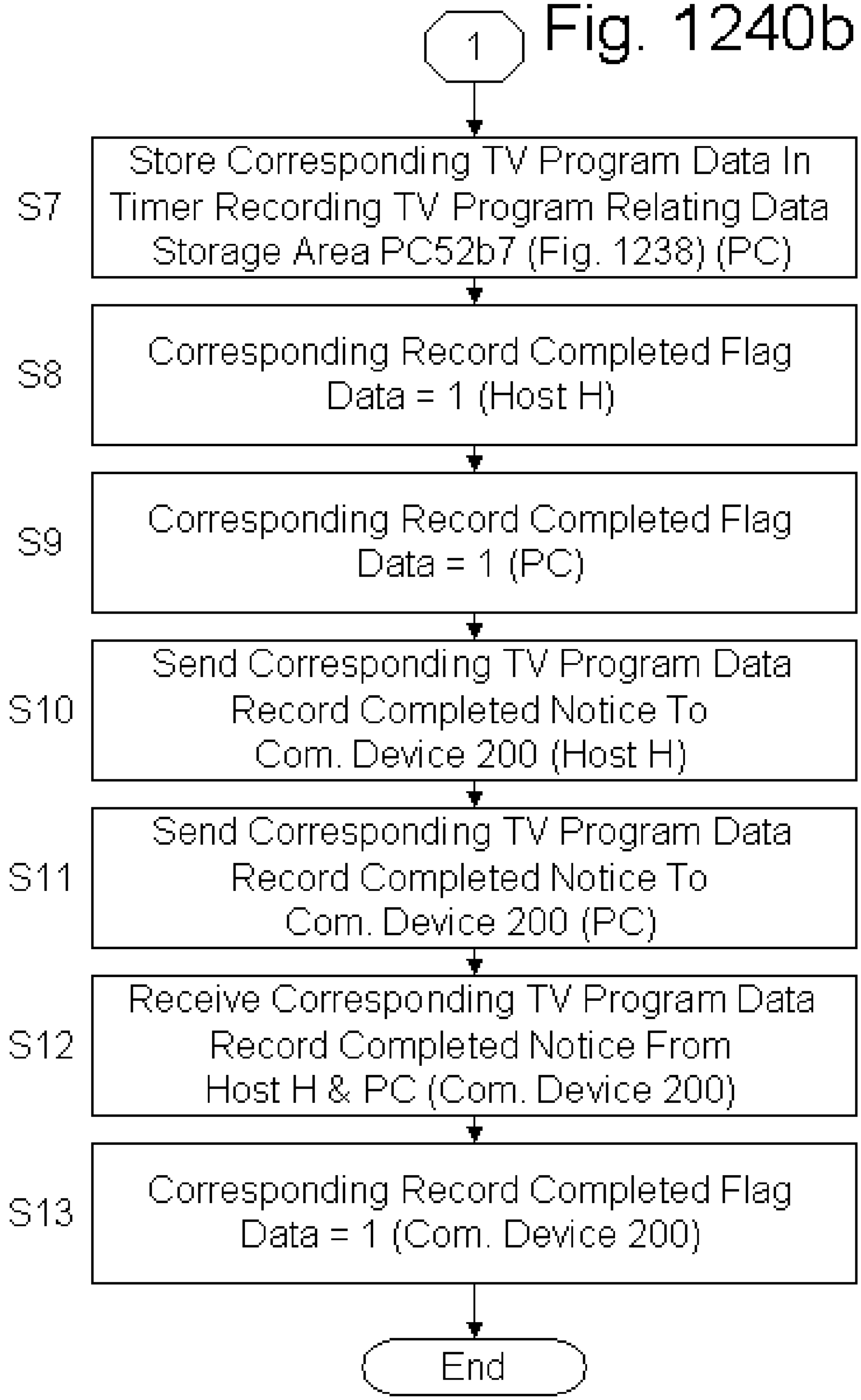

Fig. 1241a
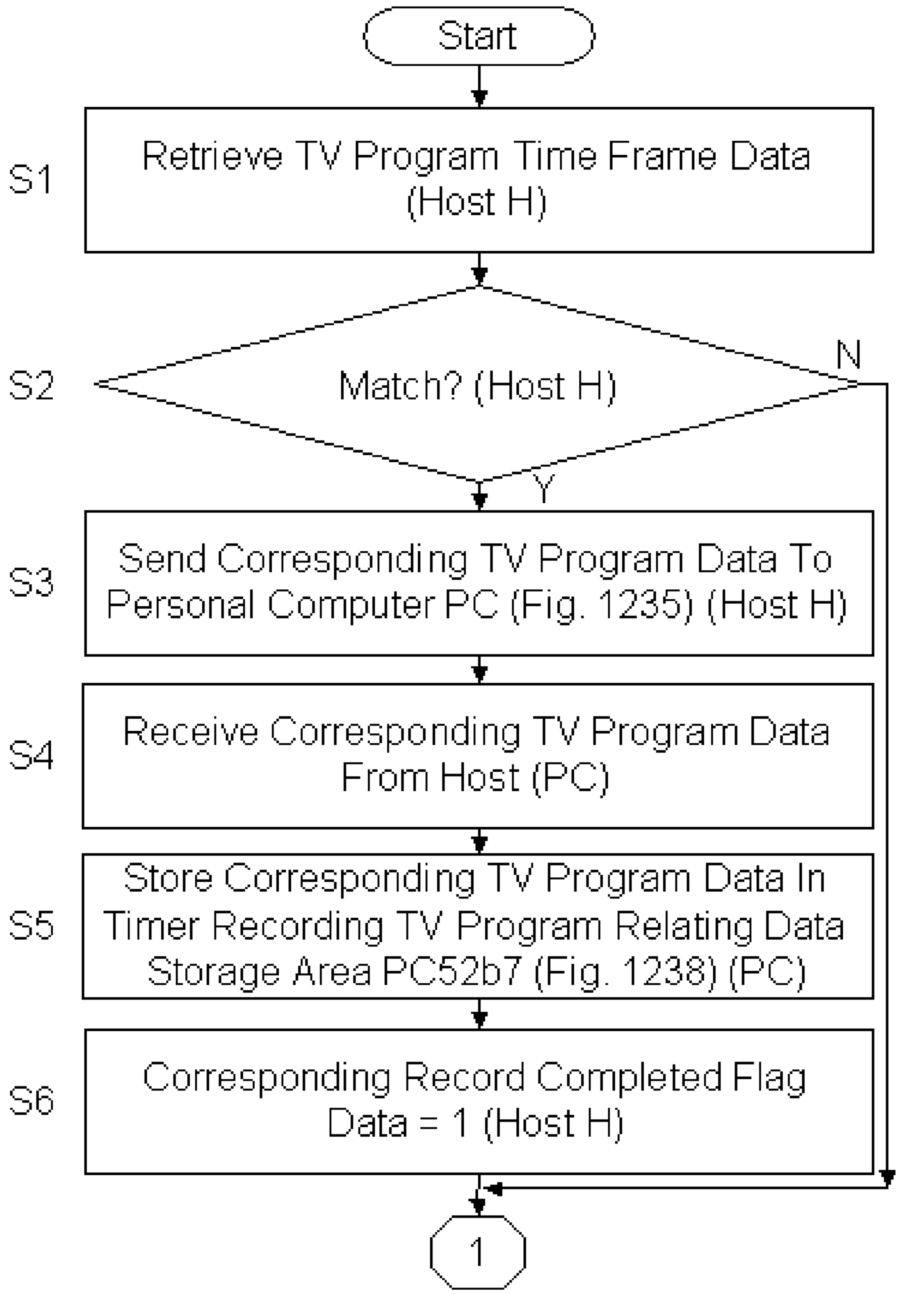

Fig. 1241b
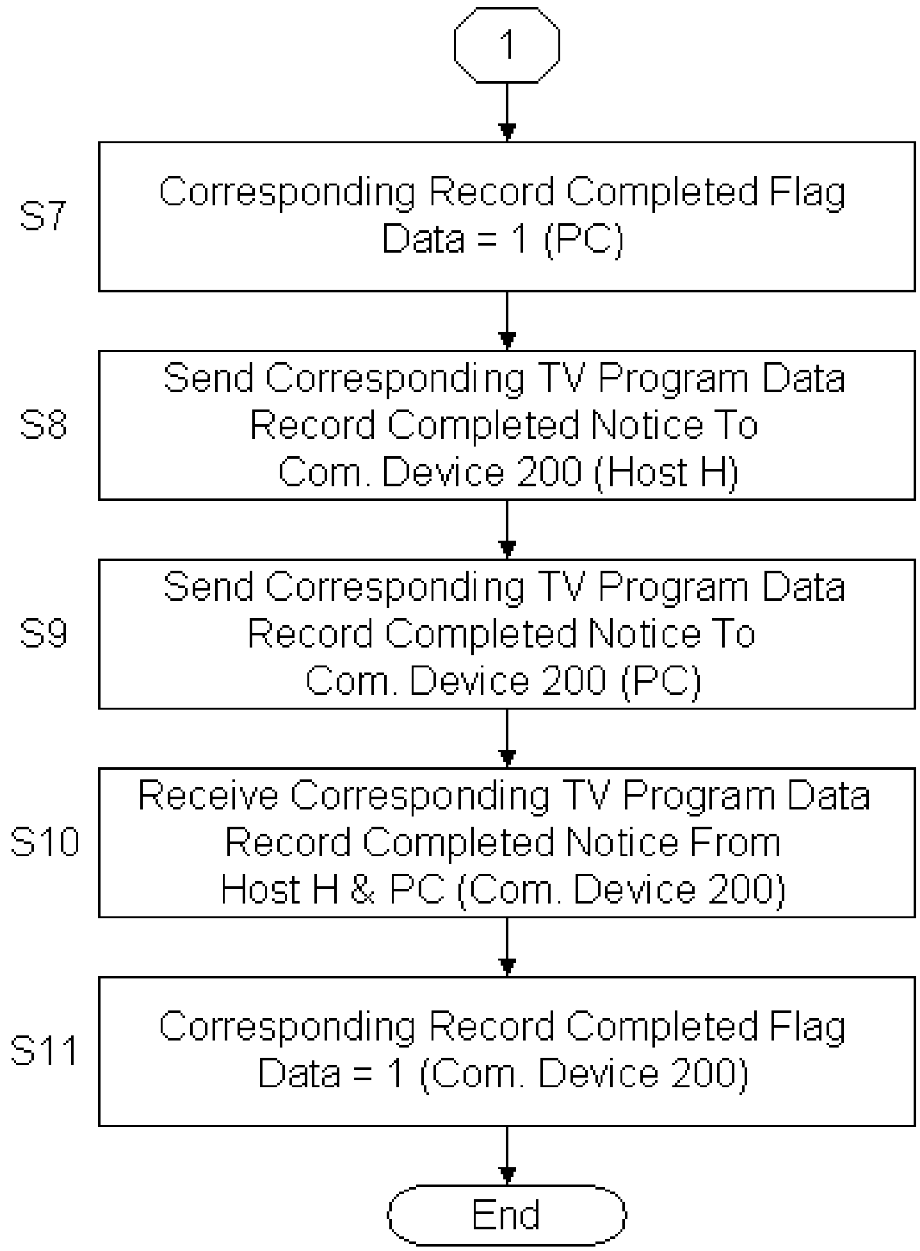

Fig. 1242
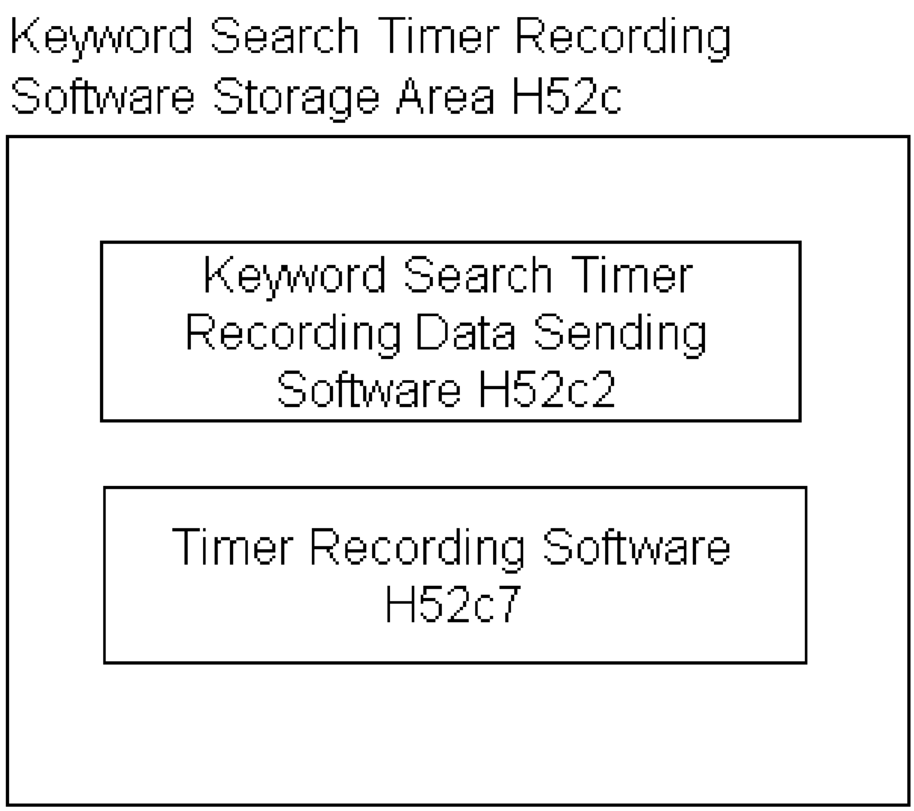

Fig. 1243
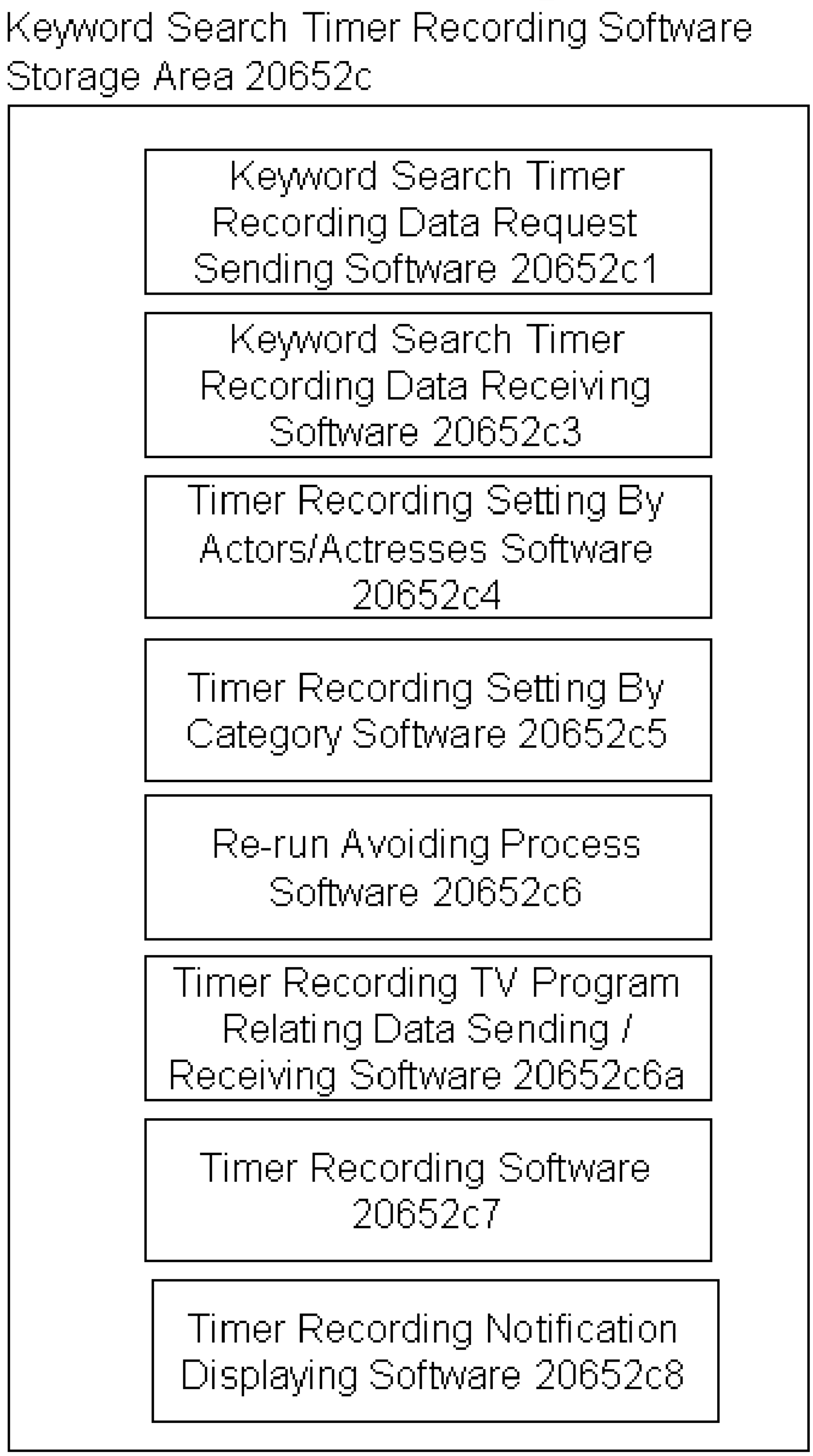

Fig. 1244
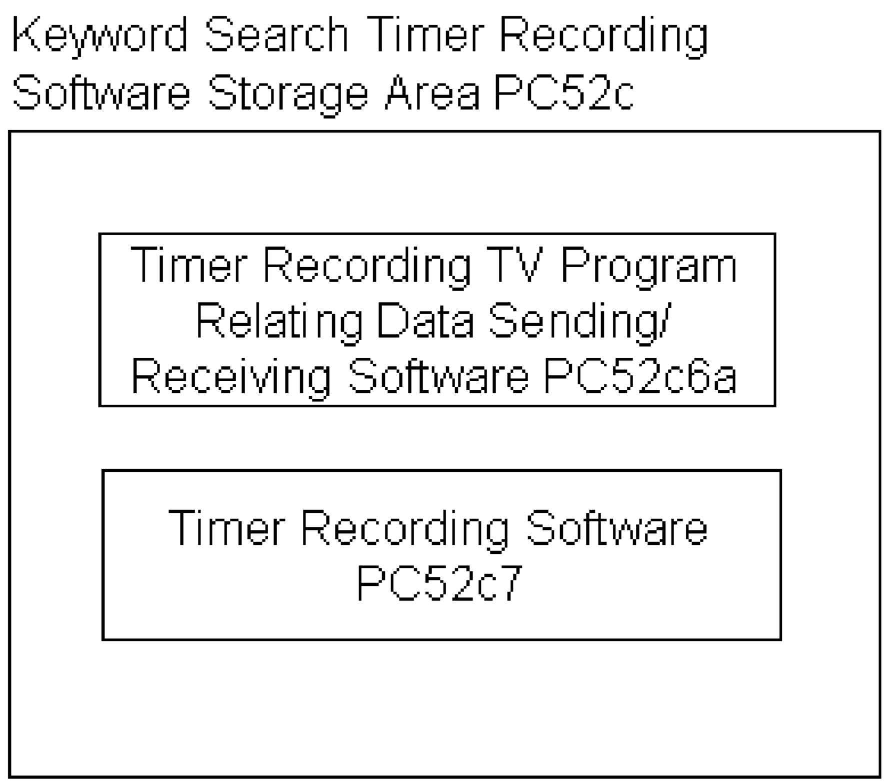

Fig. 1245
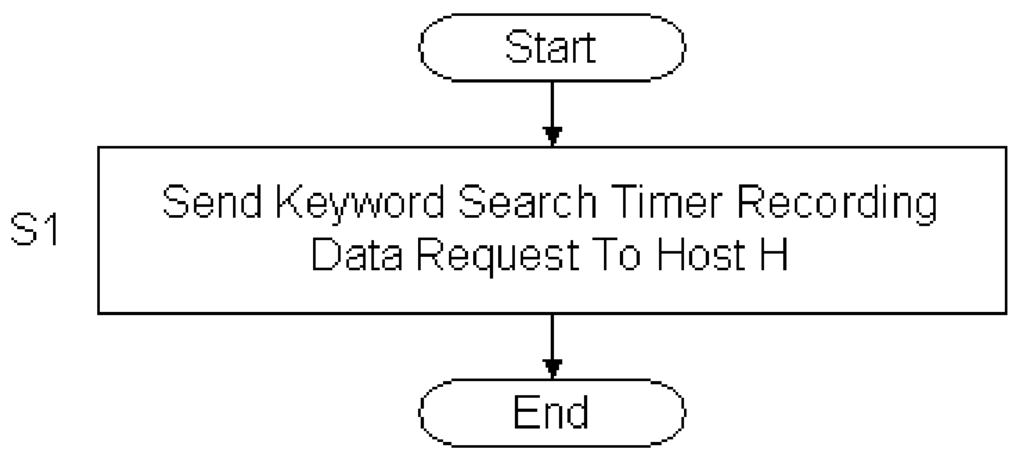

Fig. 1246
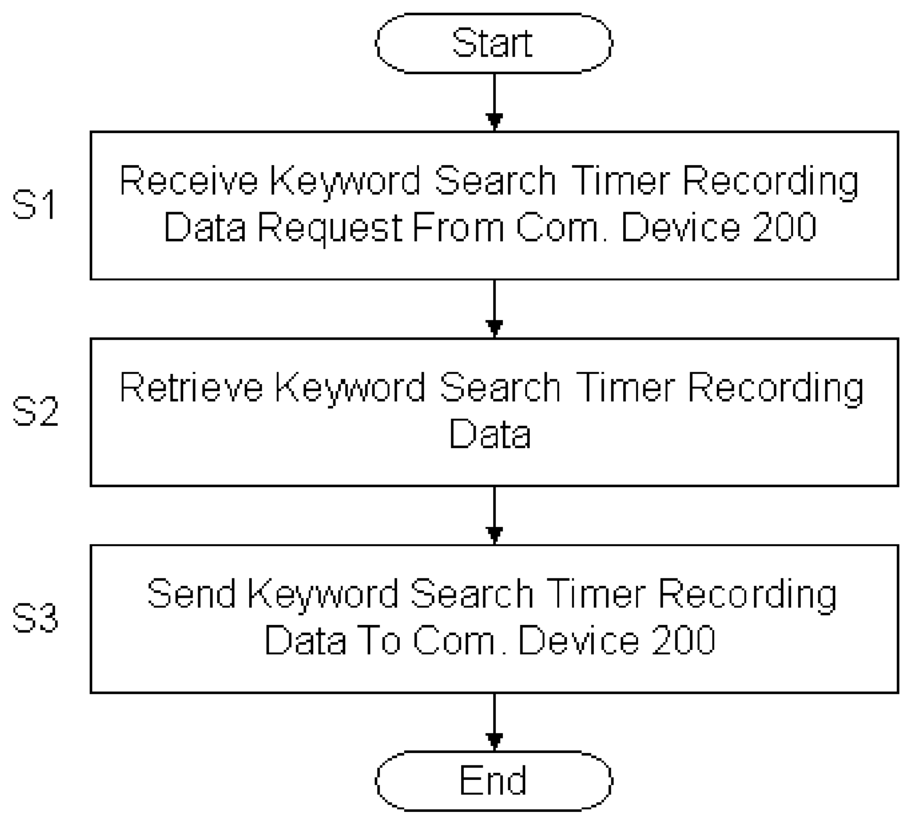

Fig. 1247
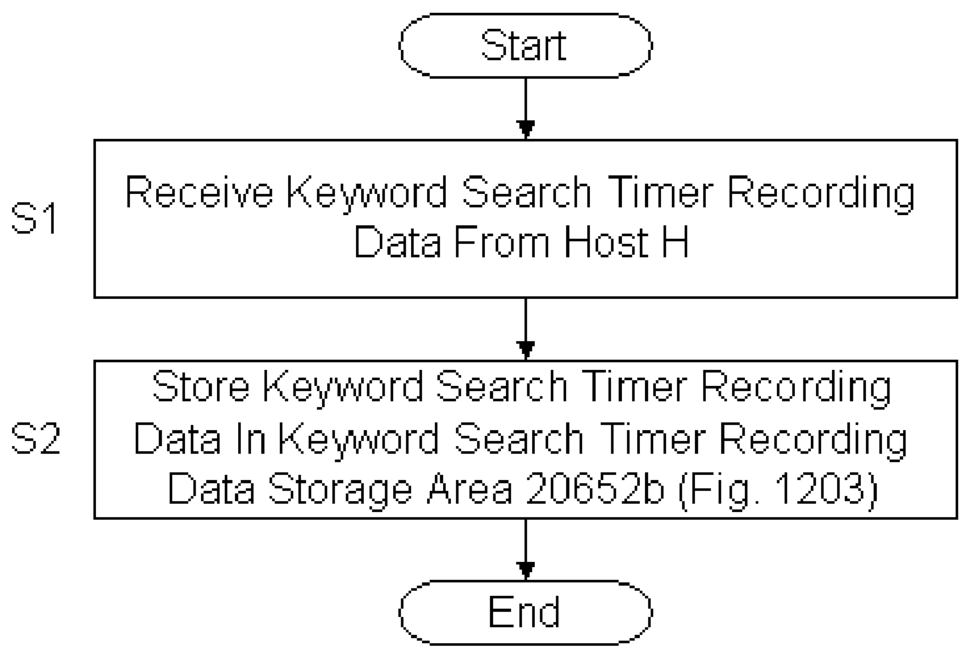

Fig. 1248
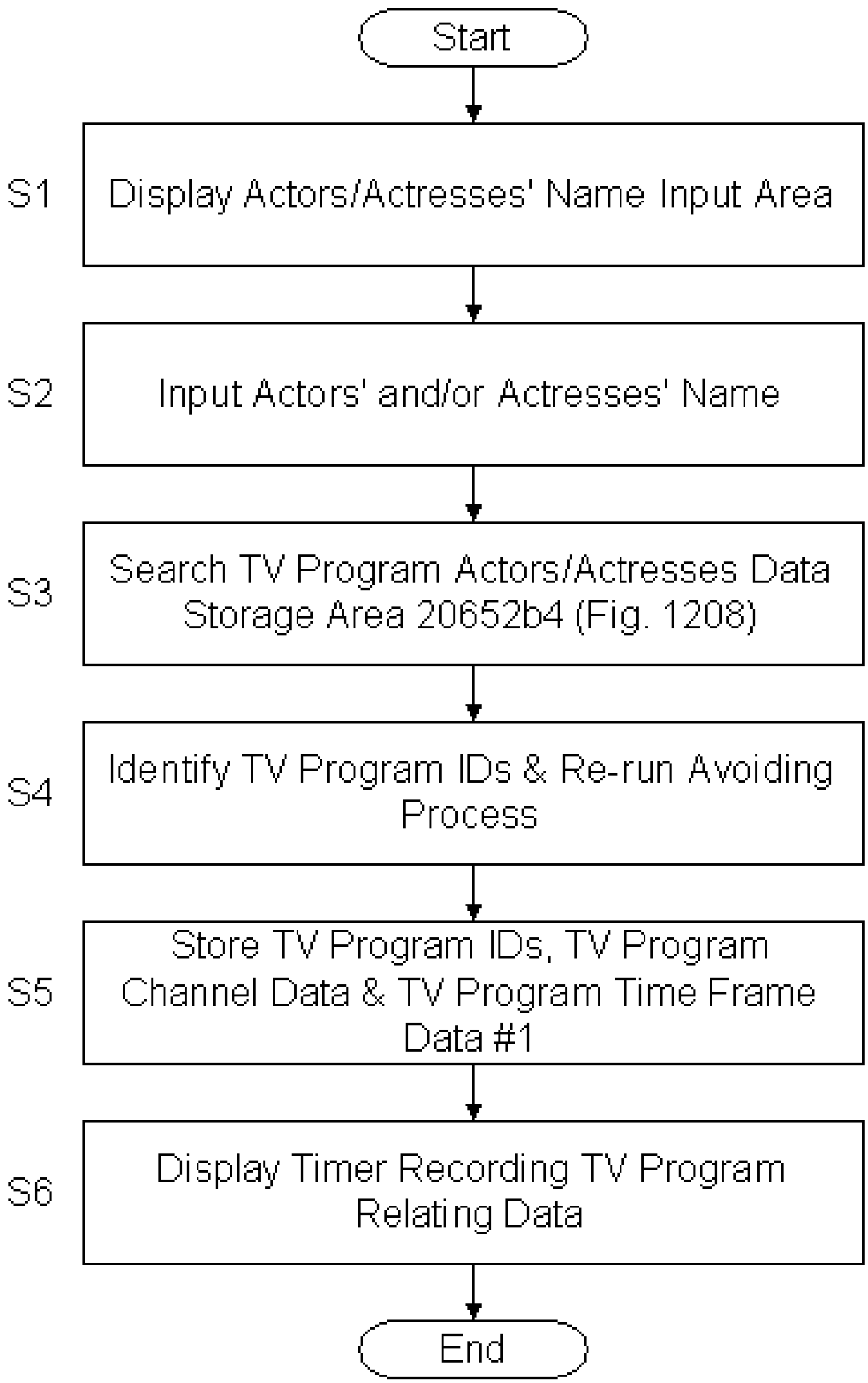

Fig. 1249
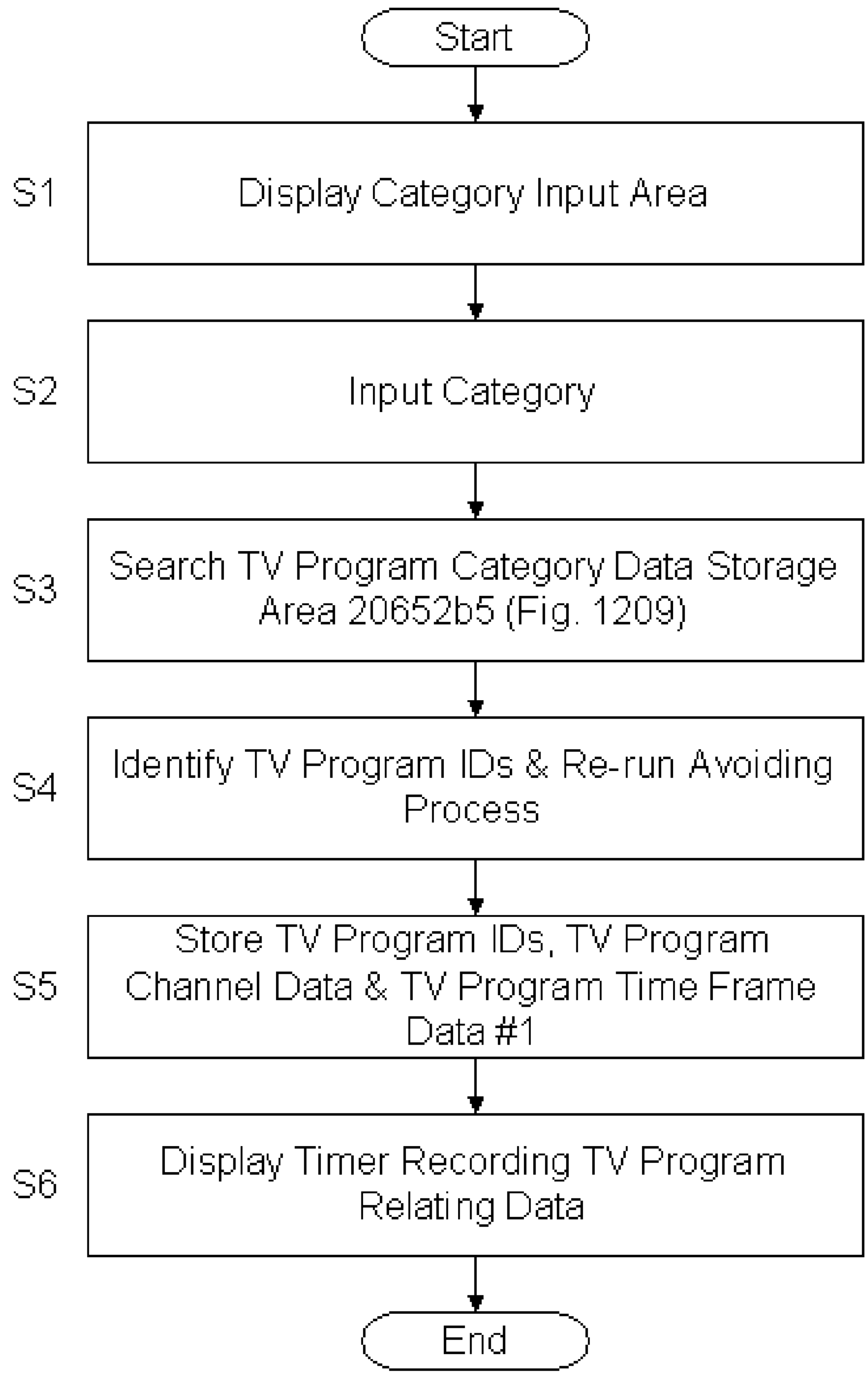

Fig. 1250
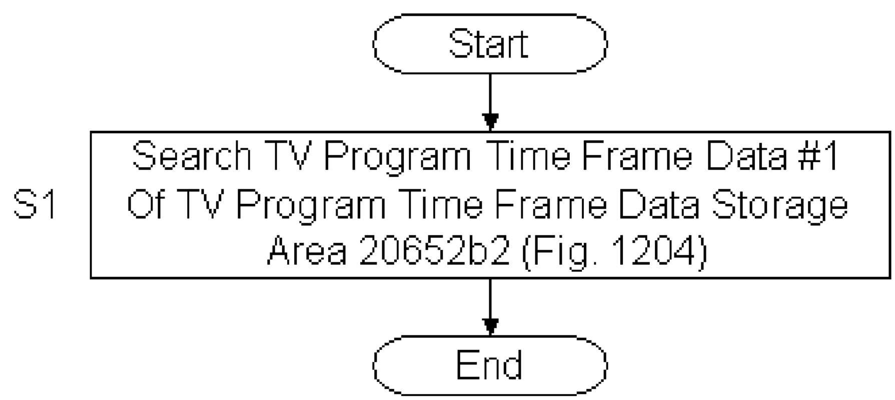

Fig. 1251
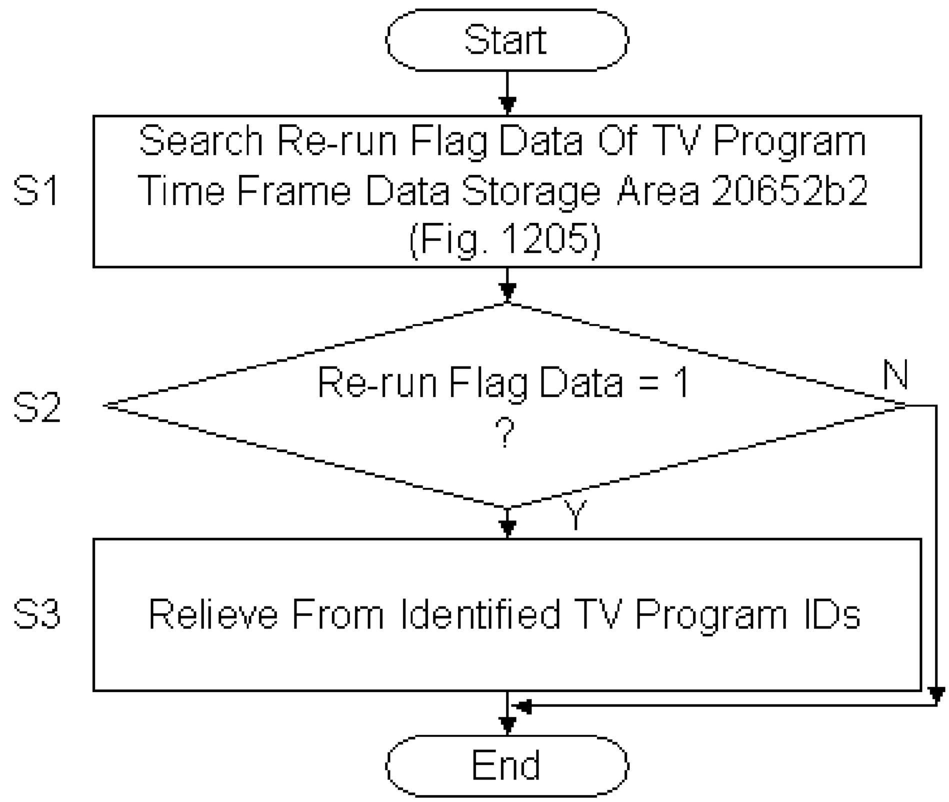

Fig. 1252
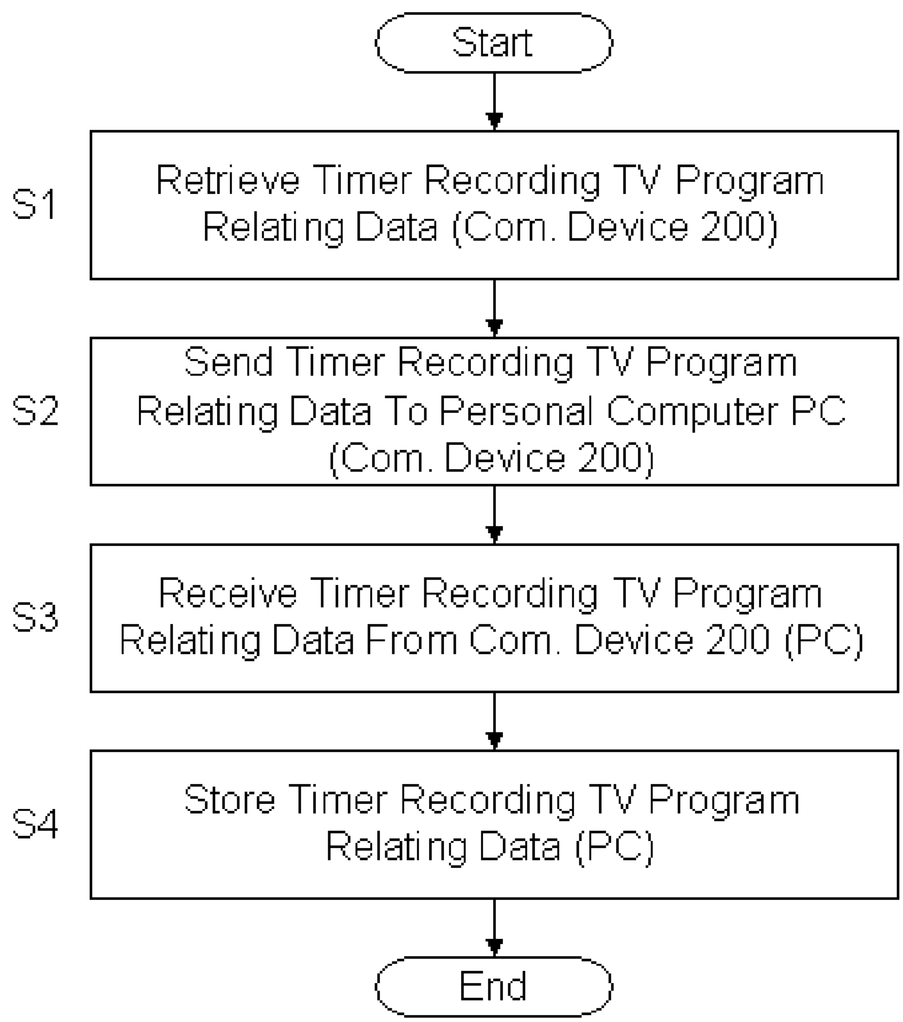

Fig. 1253a
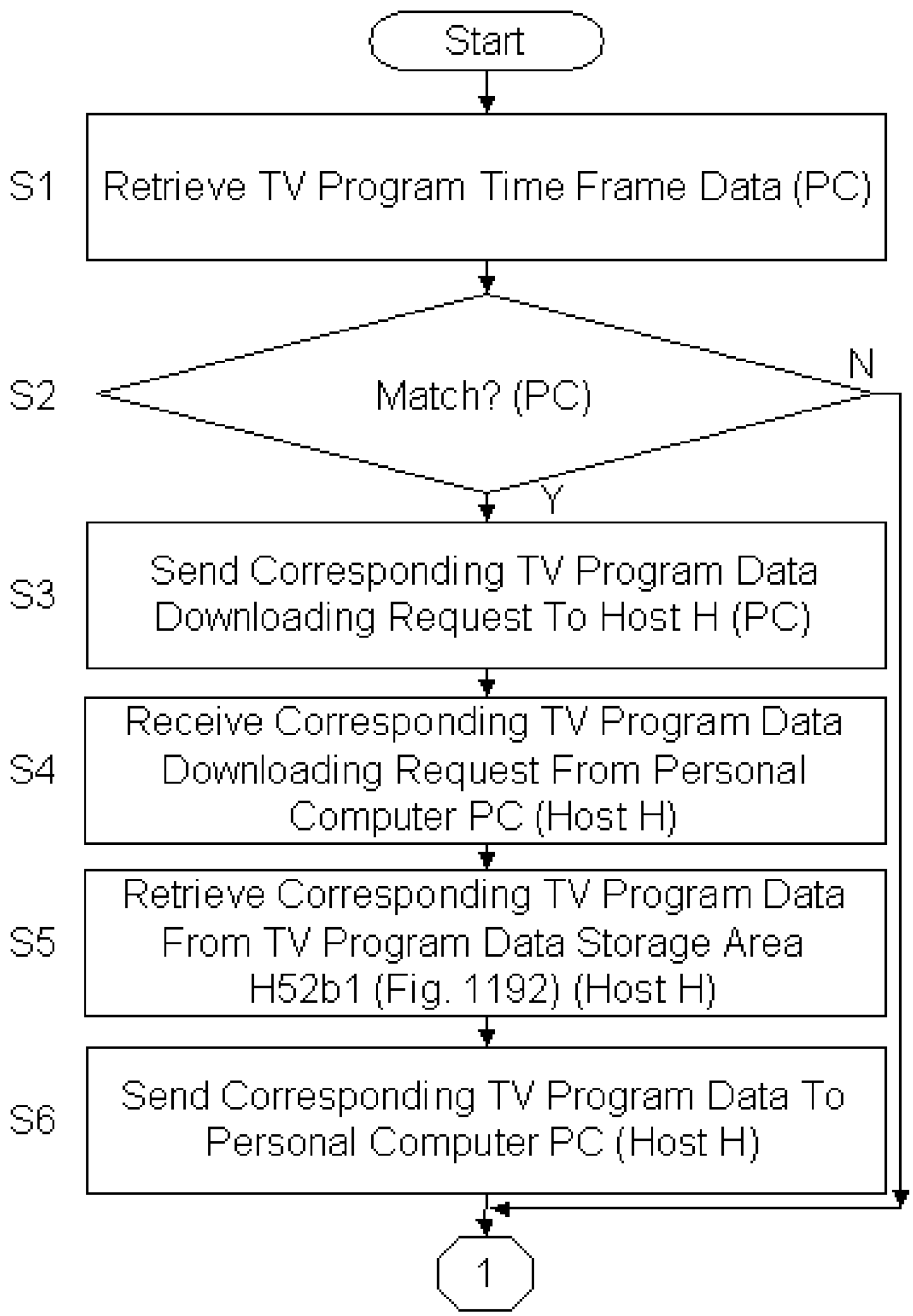

Fig. 1253b
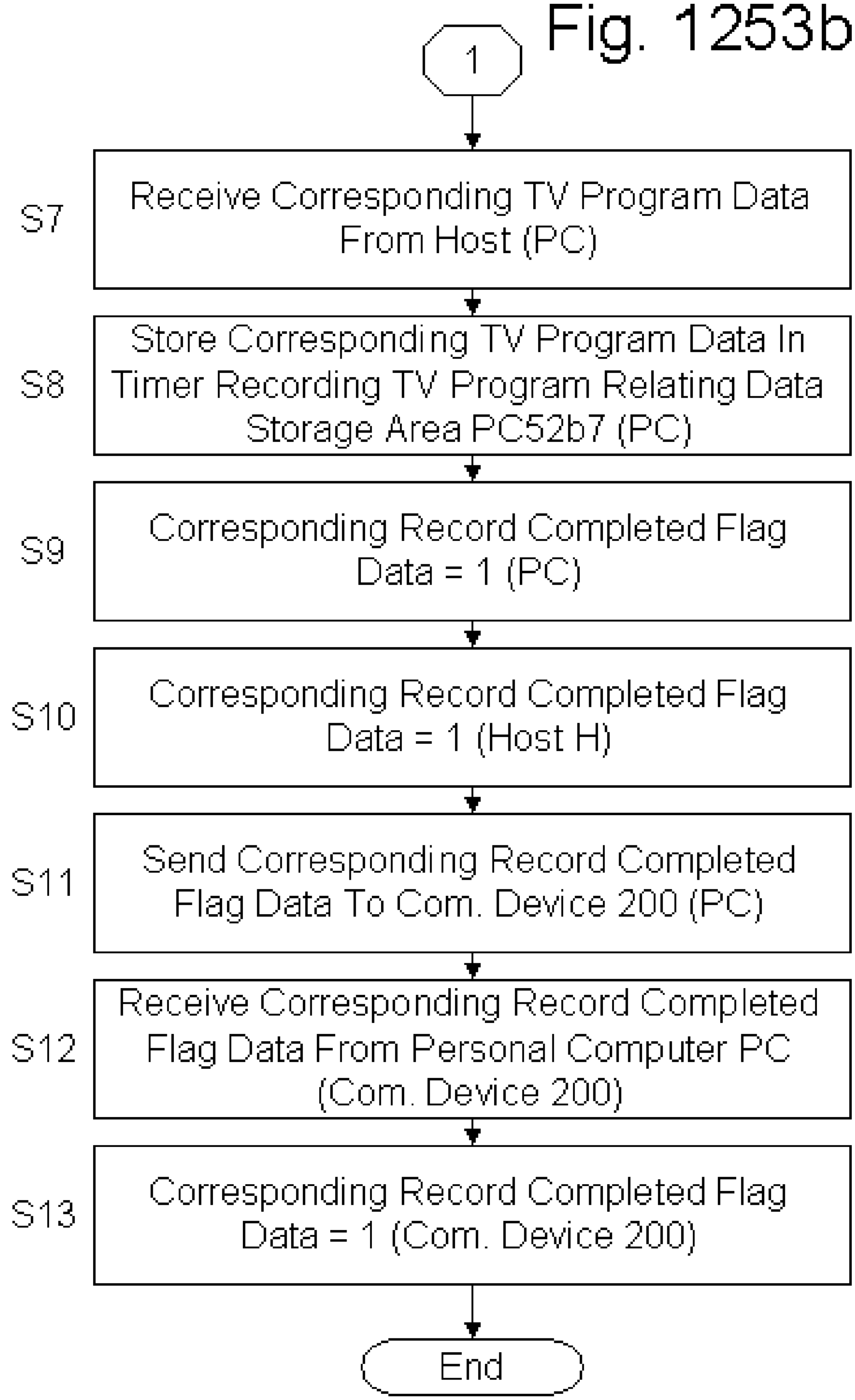

Fig. 1254
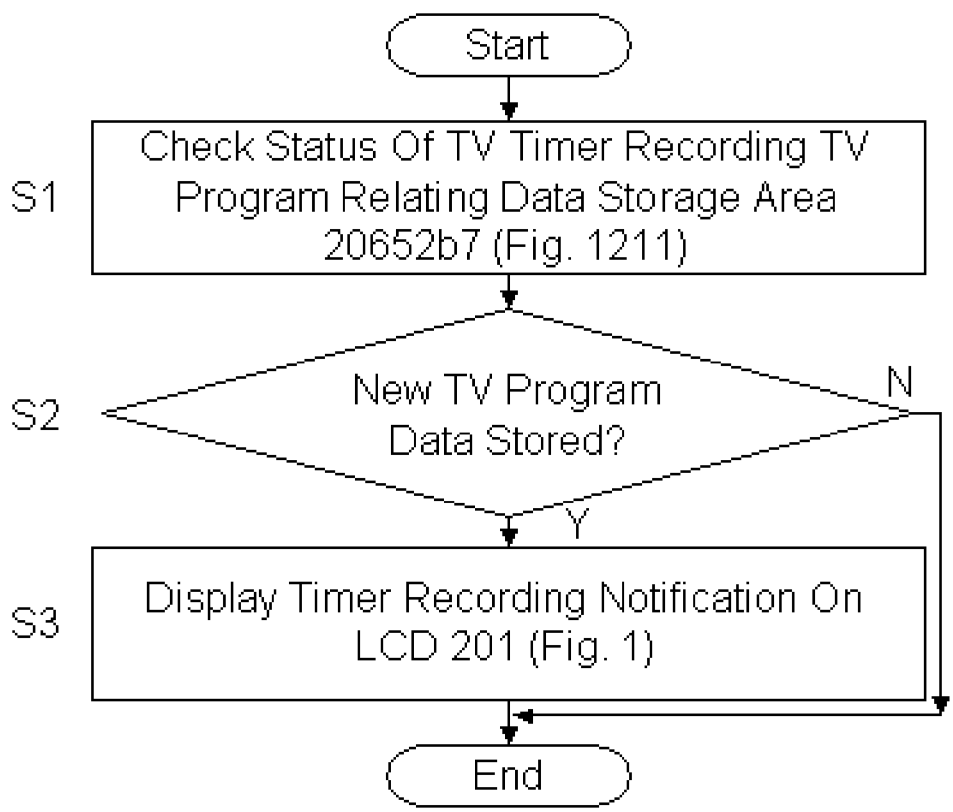

Fig. 1255
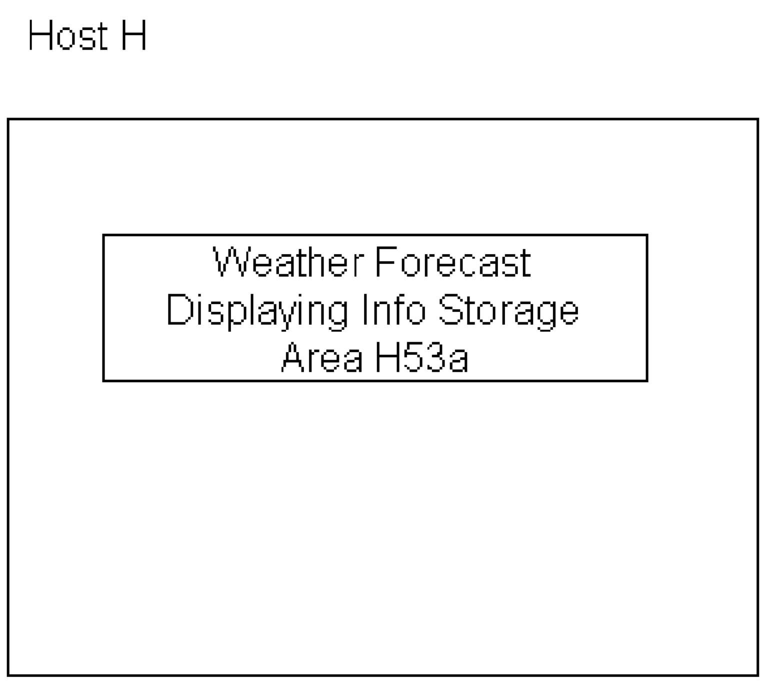

Fig. 1256
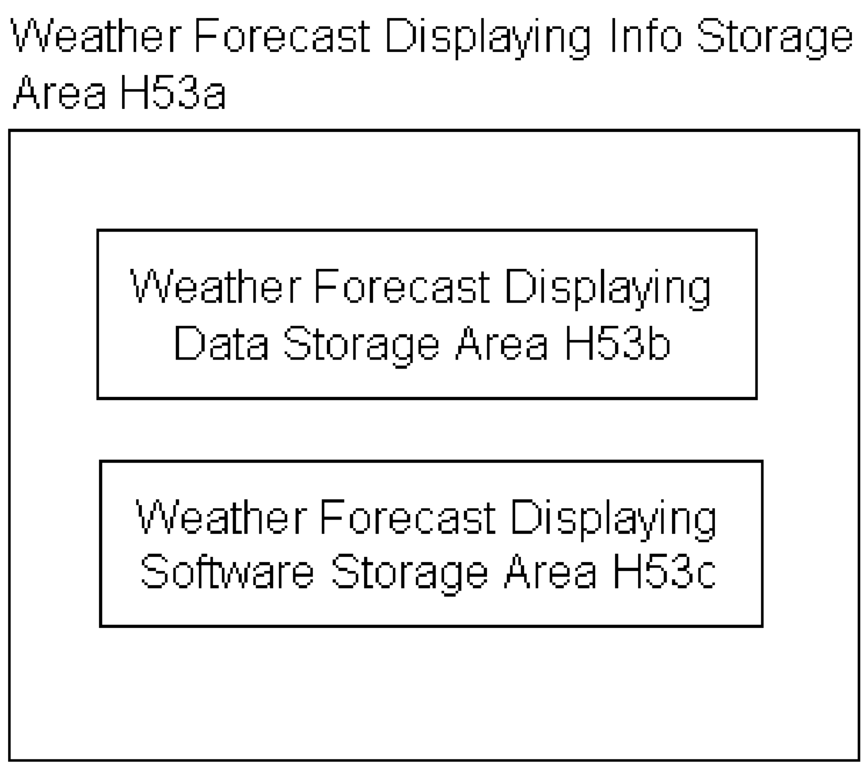

Fig. 1257
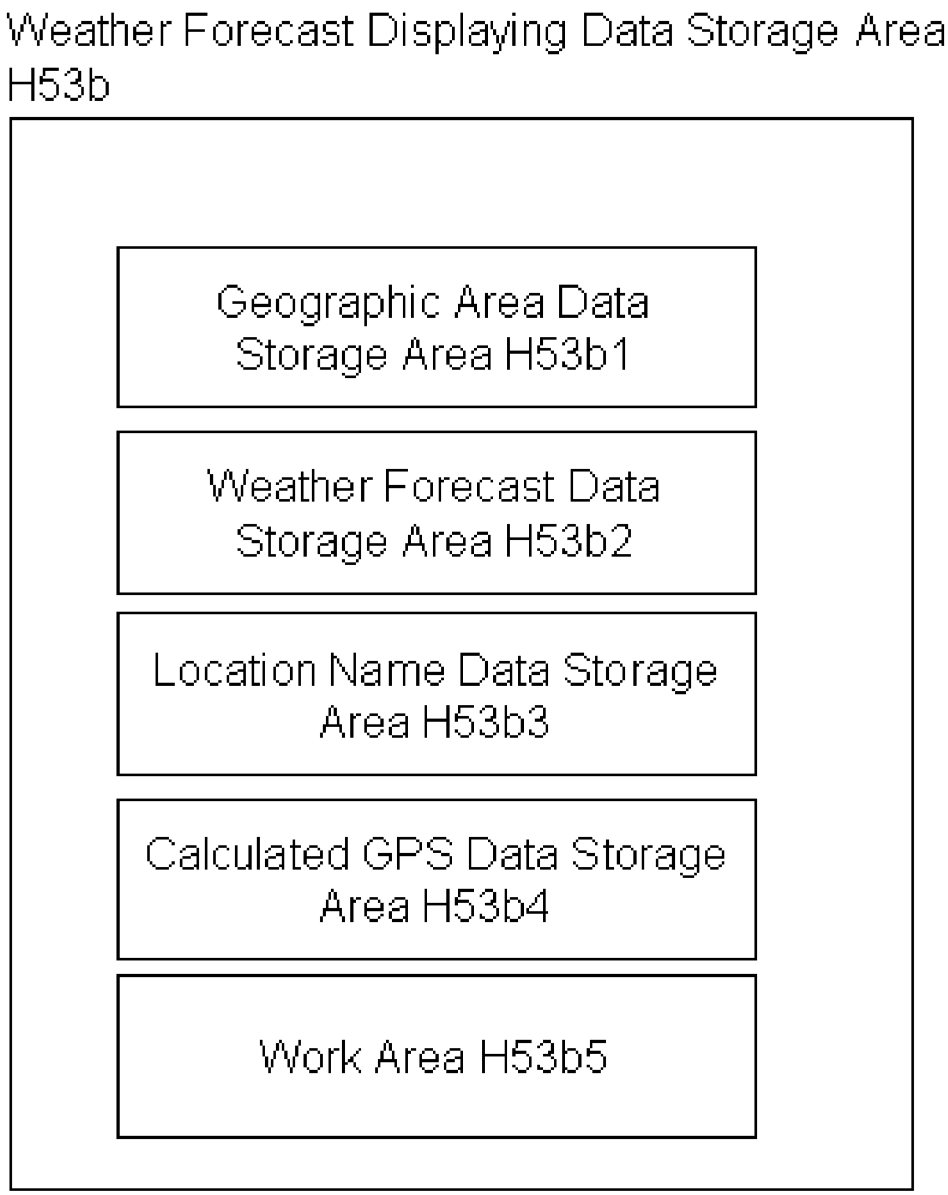

Fig. 1258

Geographic Area Data Storage Area H53b1

| Location ID | Geographic Area Data |
|---|---|
| Location #1 | Geographic Area Data#1 |
| Location #2 | Geographic Area Data#2 |
| Location #3 | Geographic Area Data#3 |
| Location #4 | Geographic Area Data#4 |

Fig. 1259

Weather Forecast Data Storage Area
H53b2

| Location ID | Weather Forecast Data |
|---|---|
| Location #1 | Sunny |
| Location #2 | Sunny |
| Location #3 | Cloudy |
| Location #4 | Cloudy |

Fig. 1260

Location Name Data Storage Area H53b3

| Location ID | Location Name Data |
|---|---|
| Location #1 | Sacramento, CA |
| Location #2 | San Jose, CA |
| Location #3 | San Francisco, CA |
| Location #4 | San Mateo, CA |

Fig. 1261

Calculated GPS Data Storage Area
H53b4

| User ID | Calculated GPS Data |
|---|---|
| User #1 | x1, y1, z1 |
| User #2 | x2, y2, z2 |
| User #3 | x3, y3, z3 |

Fig. 1262
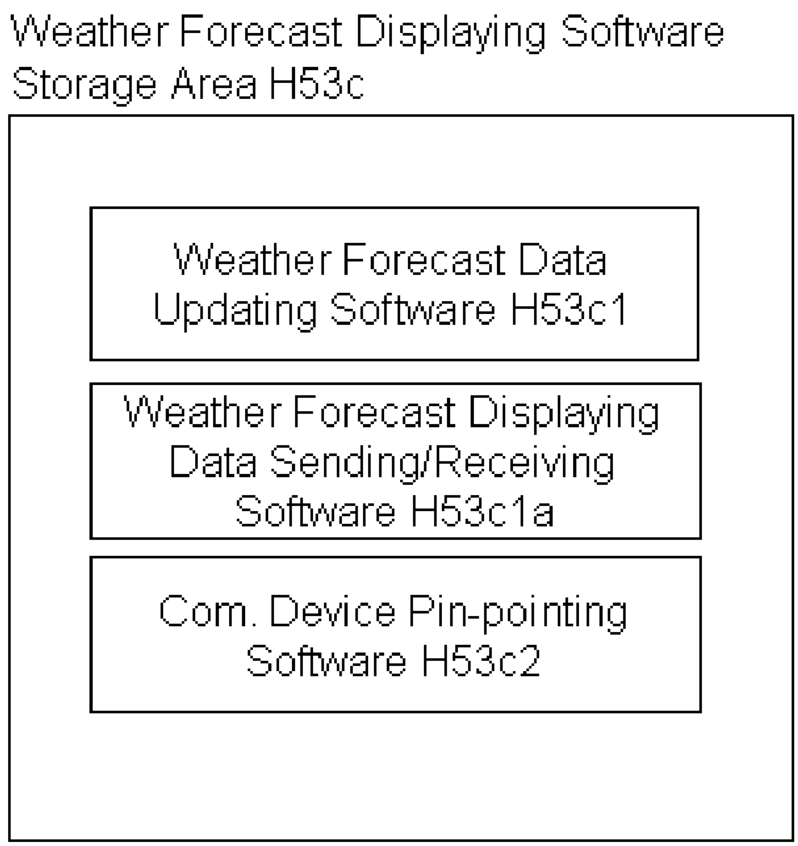

Fig. 1263
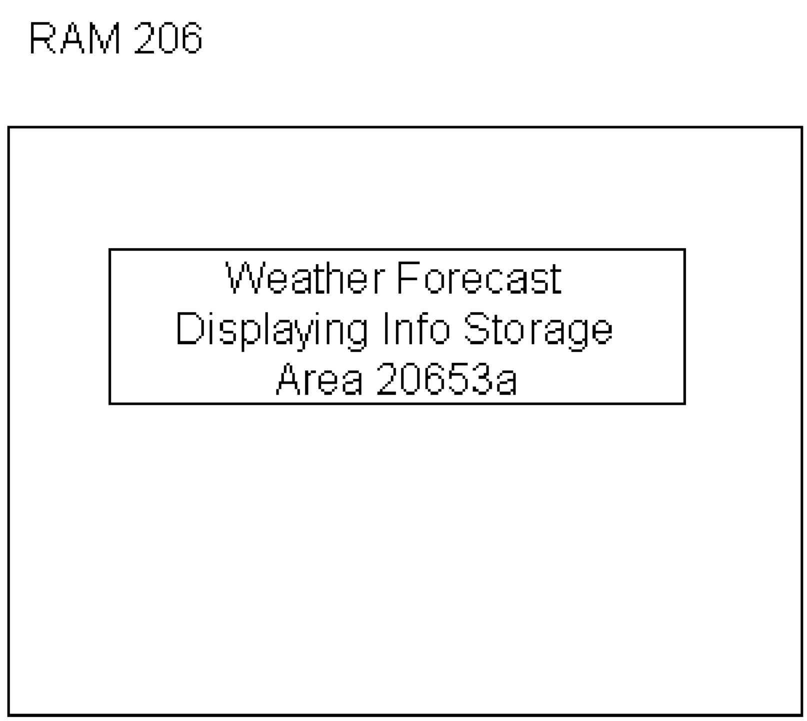

Fig. 1264
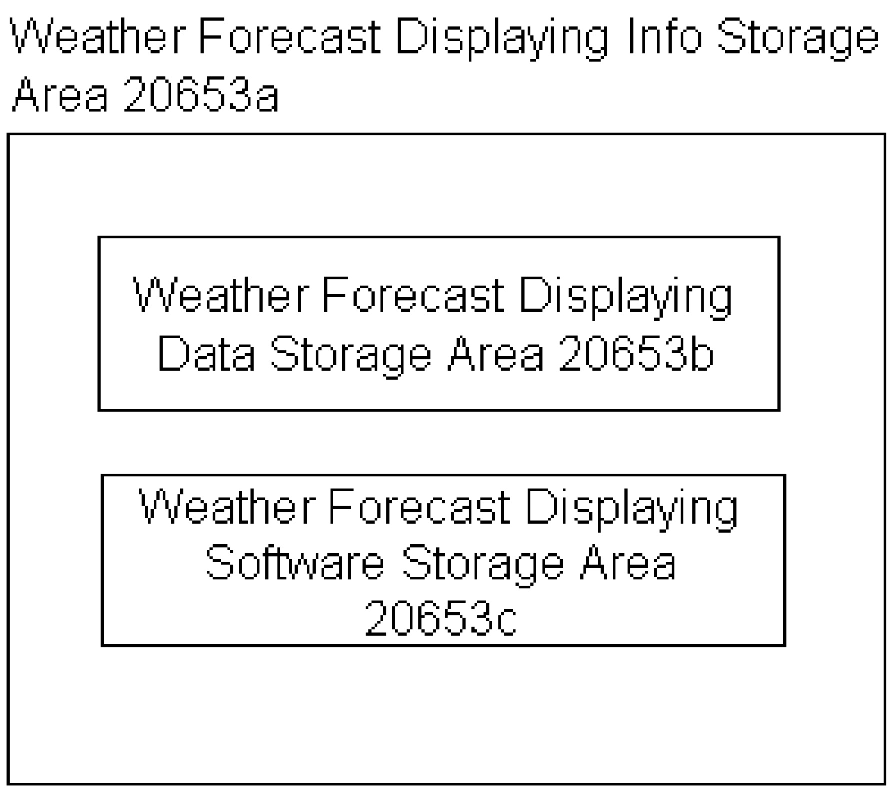

Fig. 1265
Weather Forecast Displaying Data Storage Area 20653b
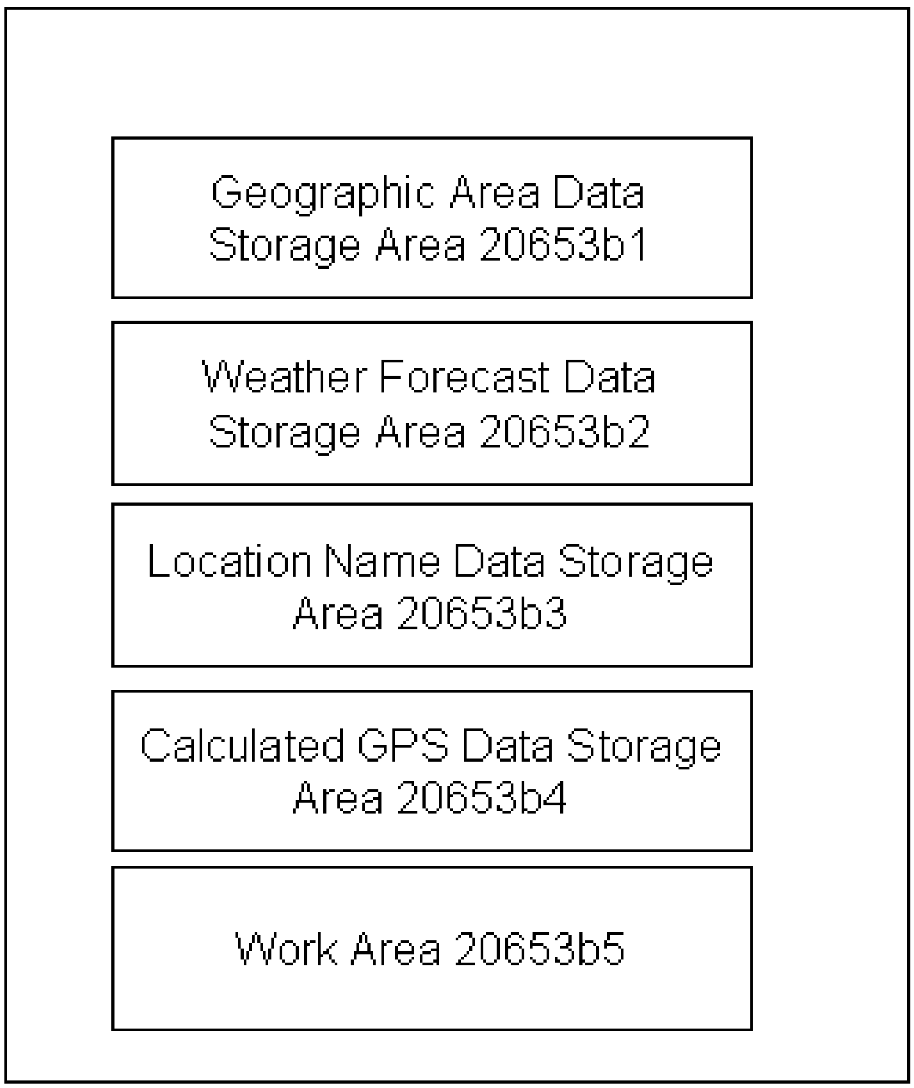

Fig. 1266

Geographic Area Data Storage Area 20653b1

| Location ID | Geographic Area Data |
|---|---|
| Location #1 | Geographic Area Data#1 |
| Location #2 | Geographic Area Data#2 |
| Location #3 | Geographic Area Data#3 |
| Location #4 | Geographic Area Data#4 |

Fig. 1267

Weather Forecast Data Storage Area 20653b2

| Location ID | Weather Forecast Data |
|---|---|
| Location #1 | Sunny |
| Location #2 | Sunny |
| Location #3 | Cloudy |
| Location #4 | Cloudy |

Fig. 1268

Location Name Data Storage Area
20653b3

| Location ID | Location Name Data |
|---|---|
| Location #1 | Sacramento, CA |
| Location #2 | San Jose, CA |
| Location #3 | San Francisco, CA |
| Location #4 | San Mateo, CA |

Fig. 1269

Calculated GPS Data Storage Area 20653b4

| User ID | Calculated GPS Data |
|---|---|
| User #1 | x1, y1, z1 |

Fig. 1270
Weather Forecast Displaying Software Storage Area 20653c
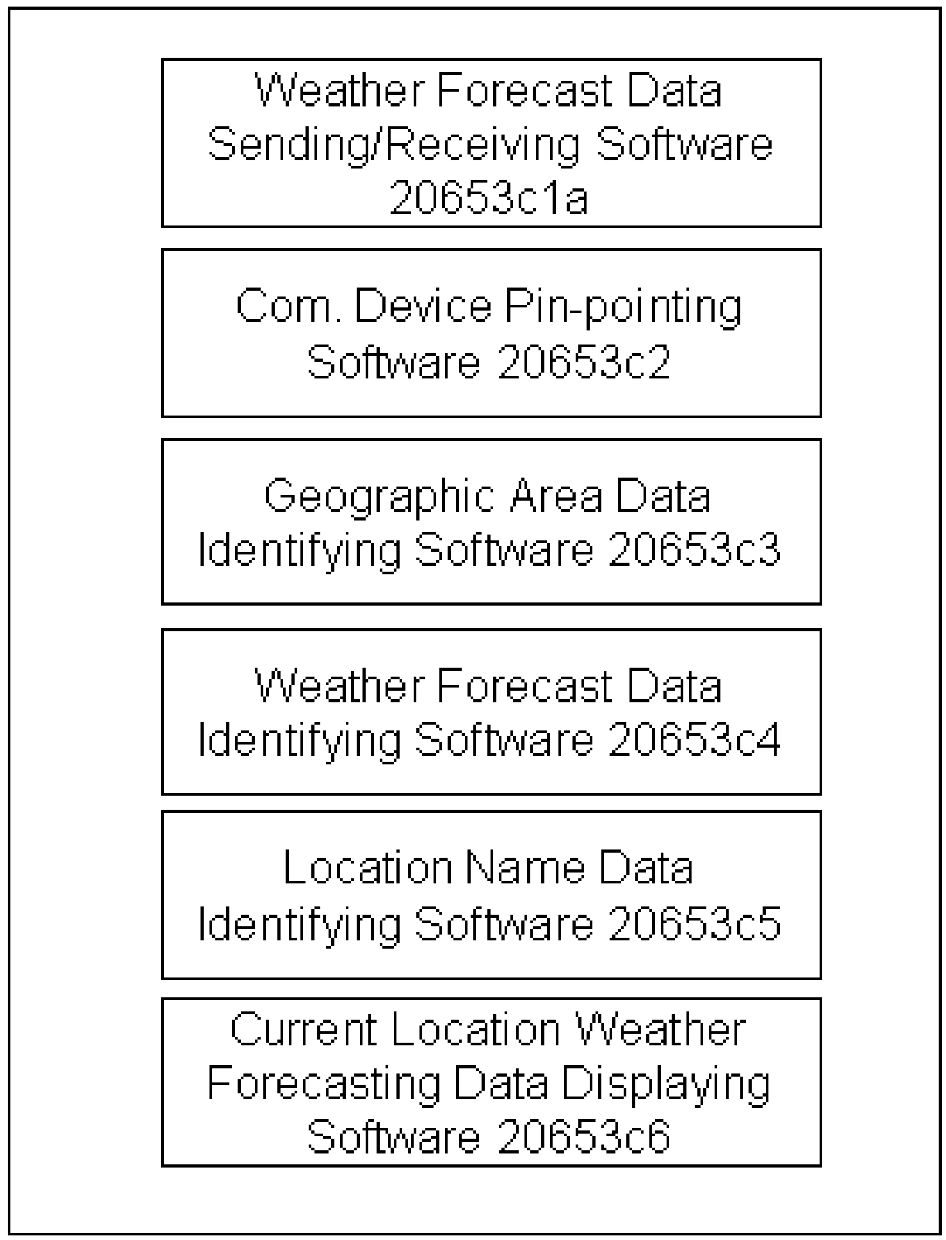

Fig. 1271
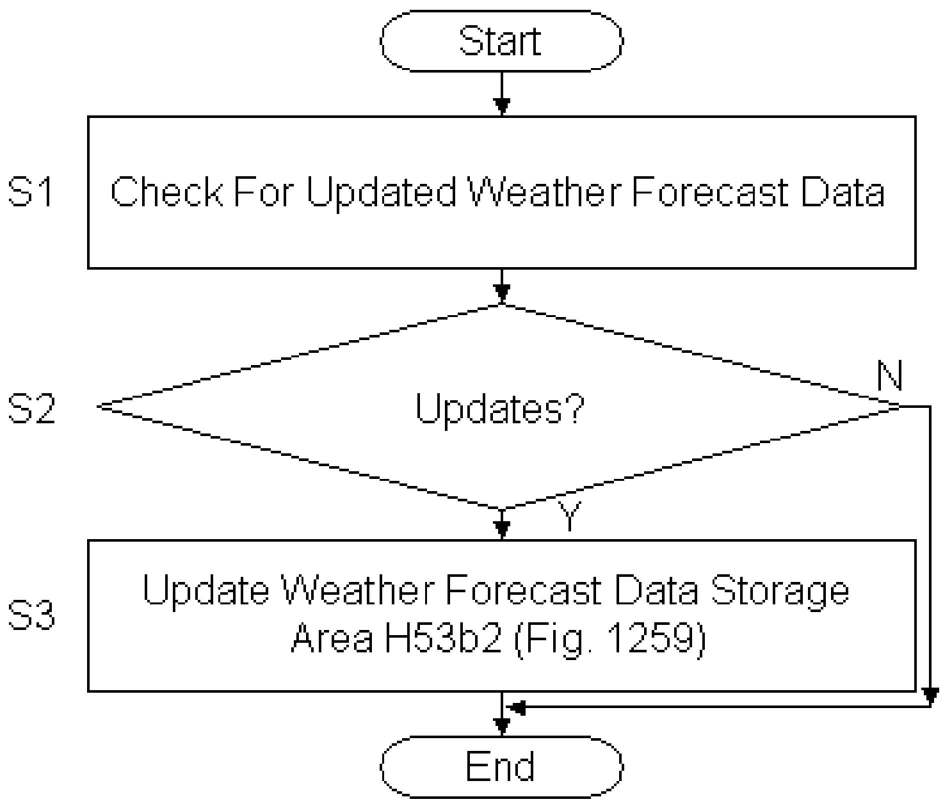

Fig. 1272
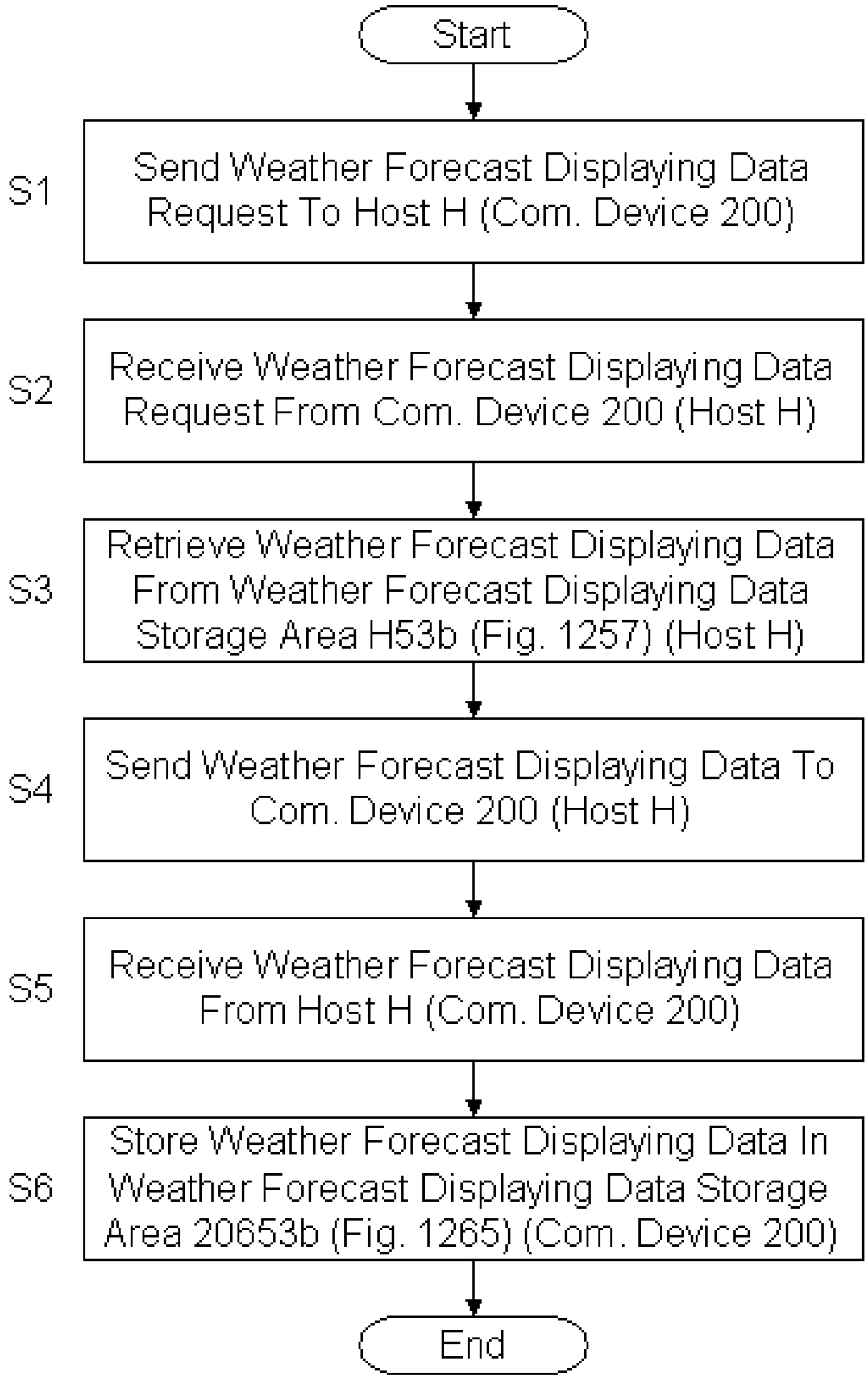

Fig. 1273
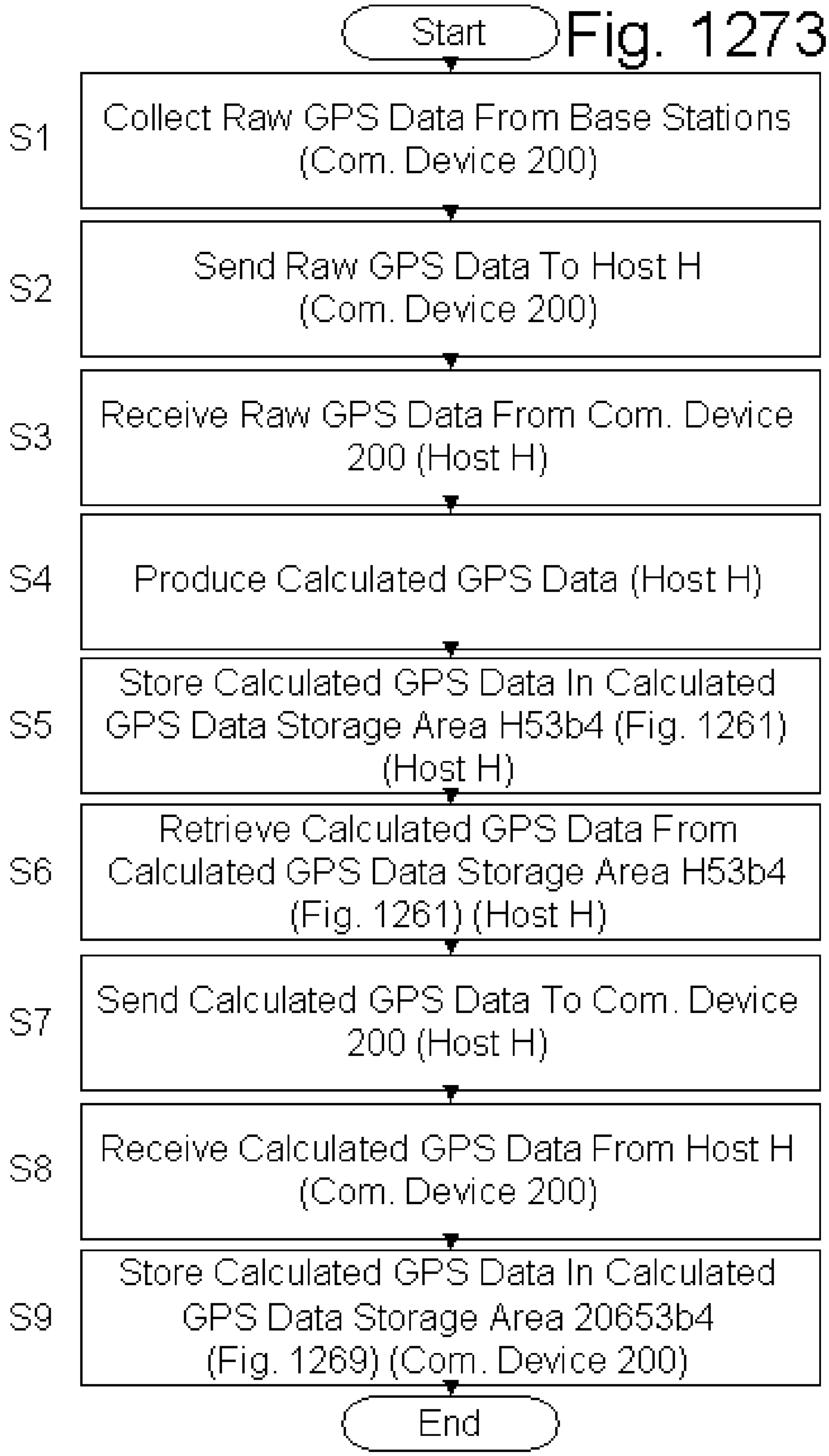

Fig. 1274
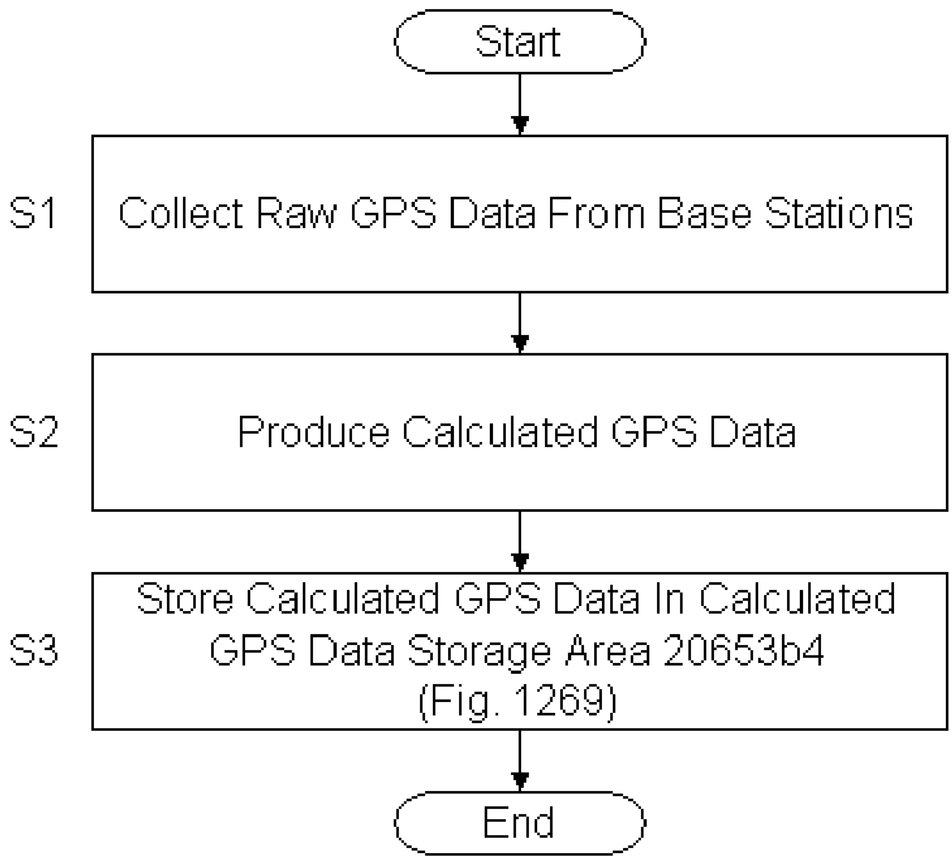

Fig. 1275
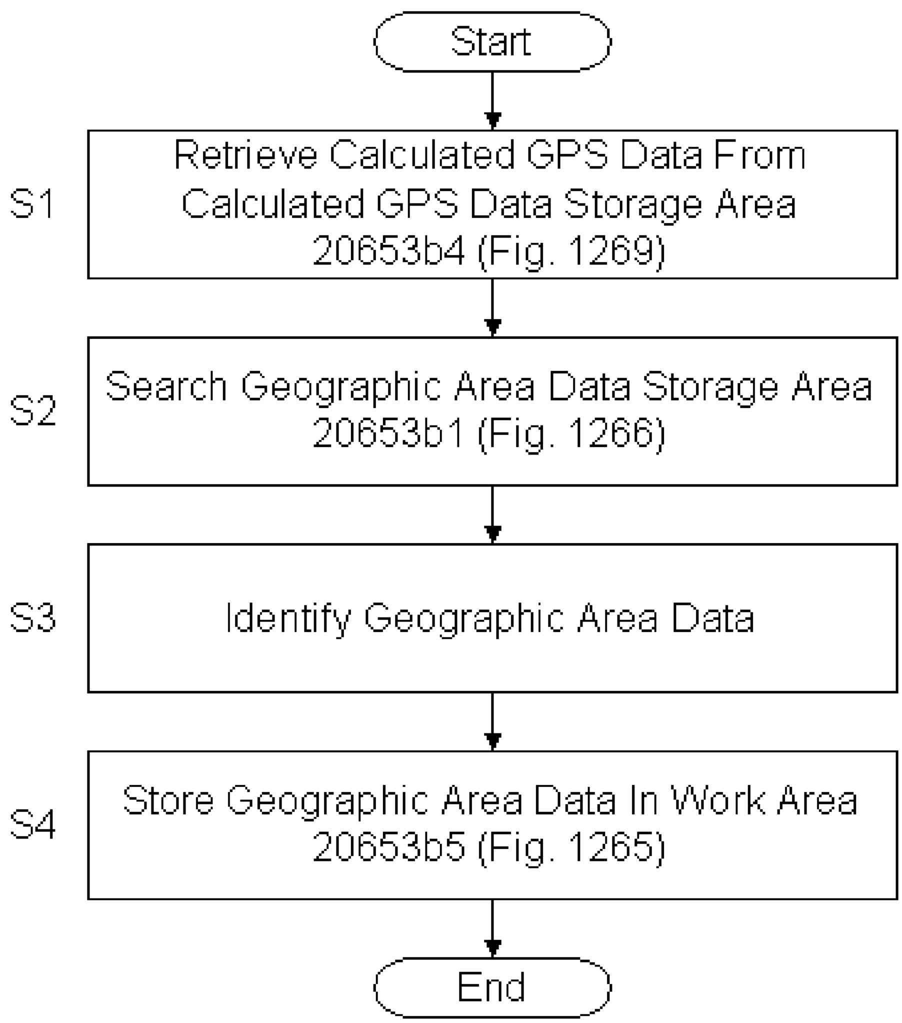

Fig. 1276
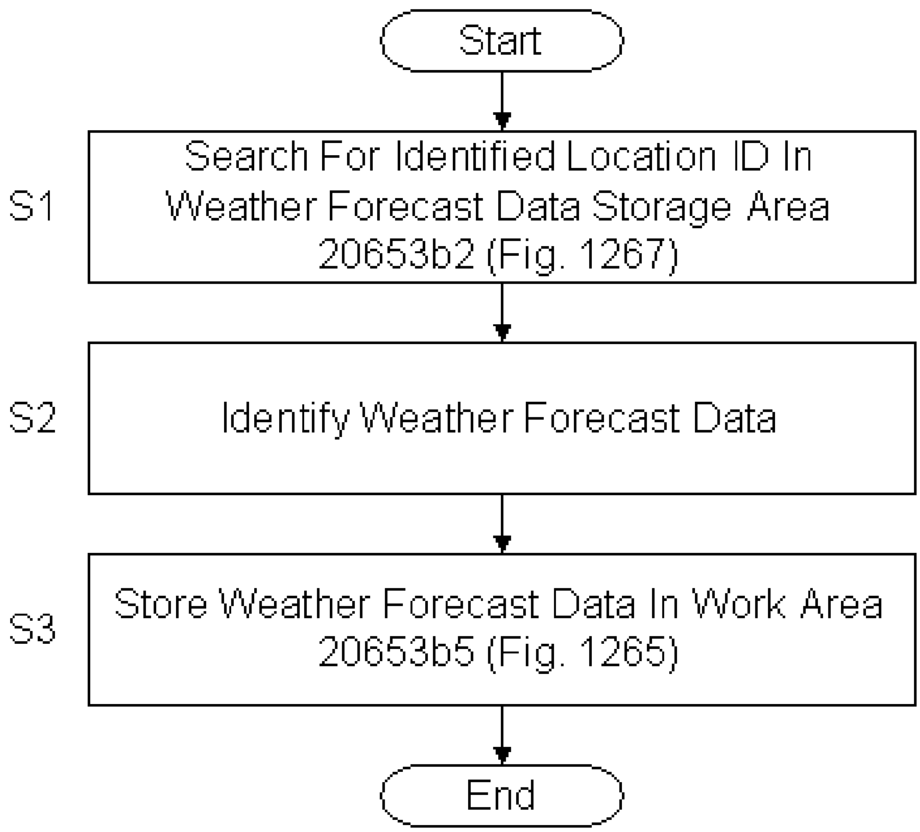

Fig. 1277
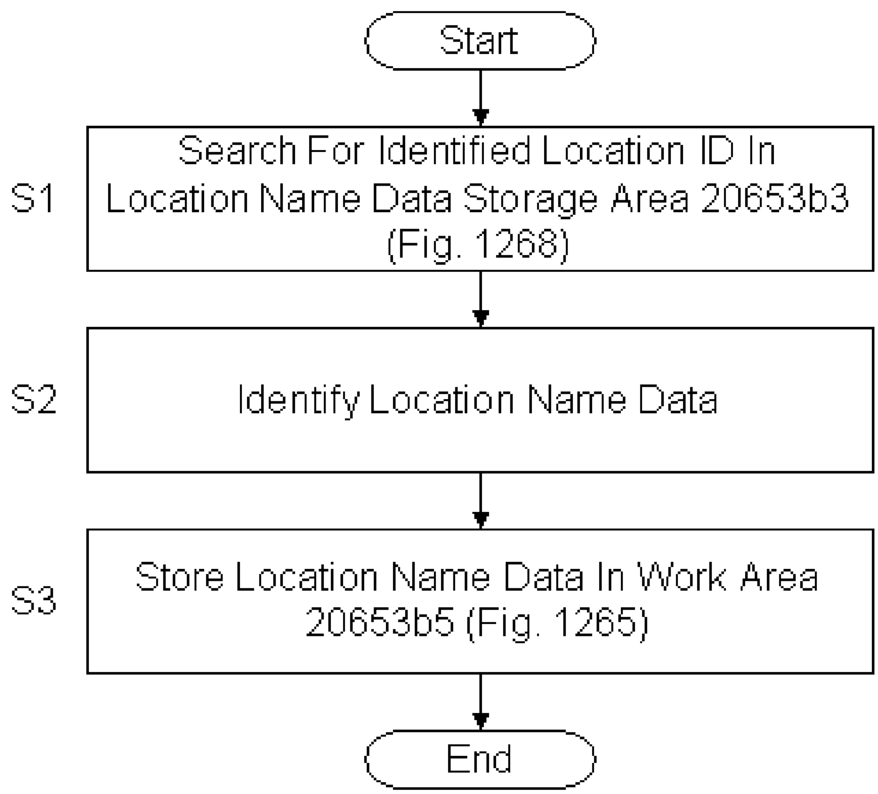

Fig. 1278
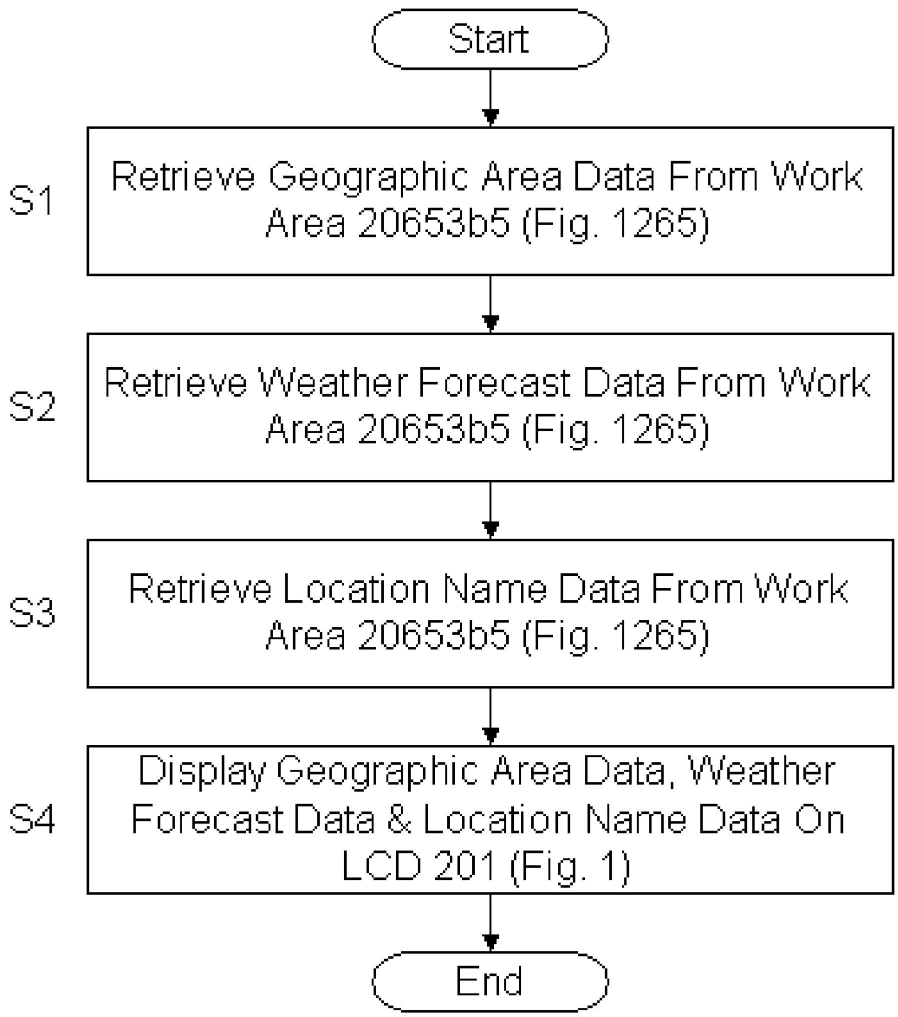

Fig. 1279
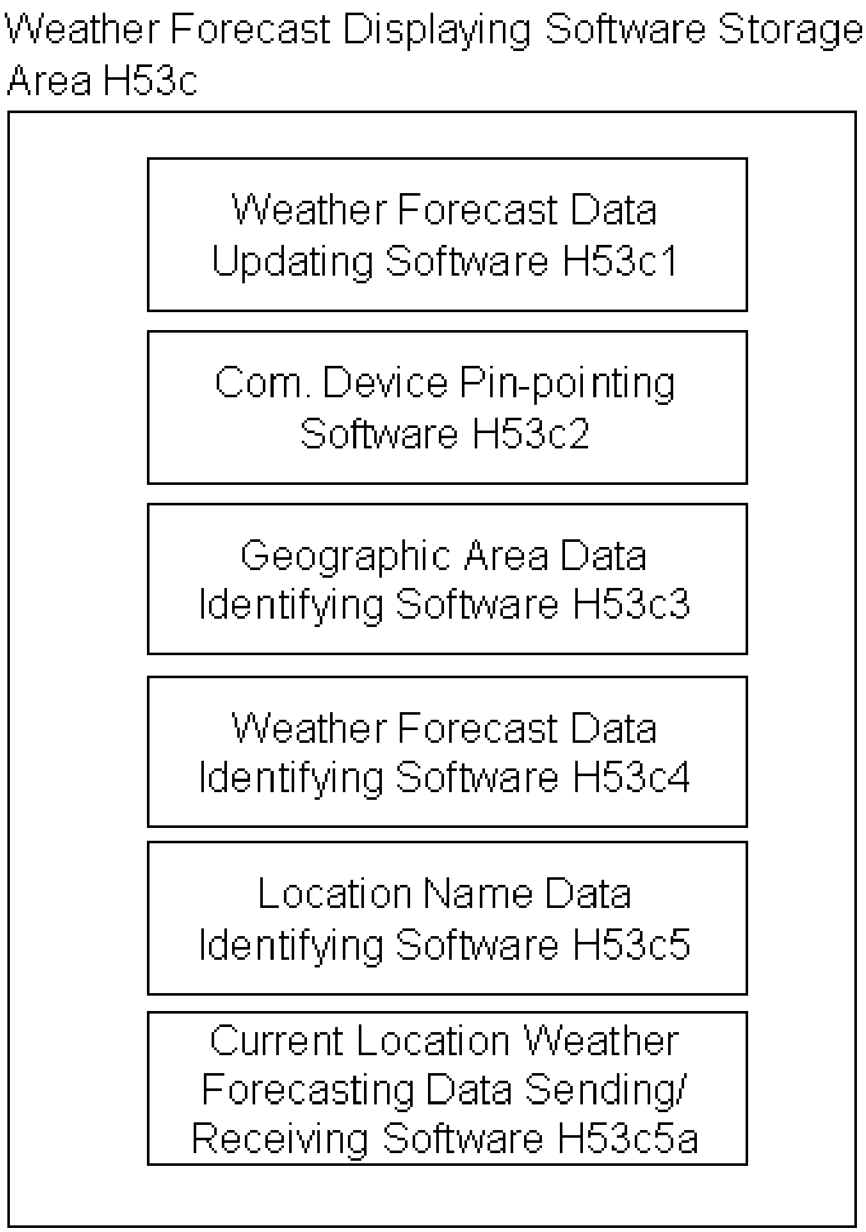

Fig. 1280
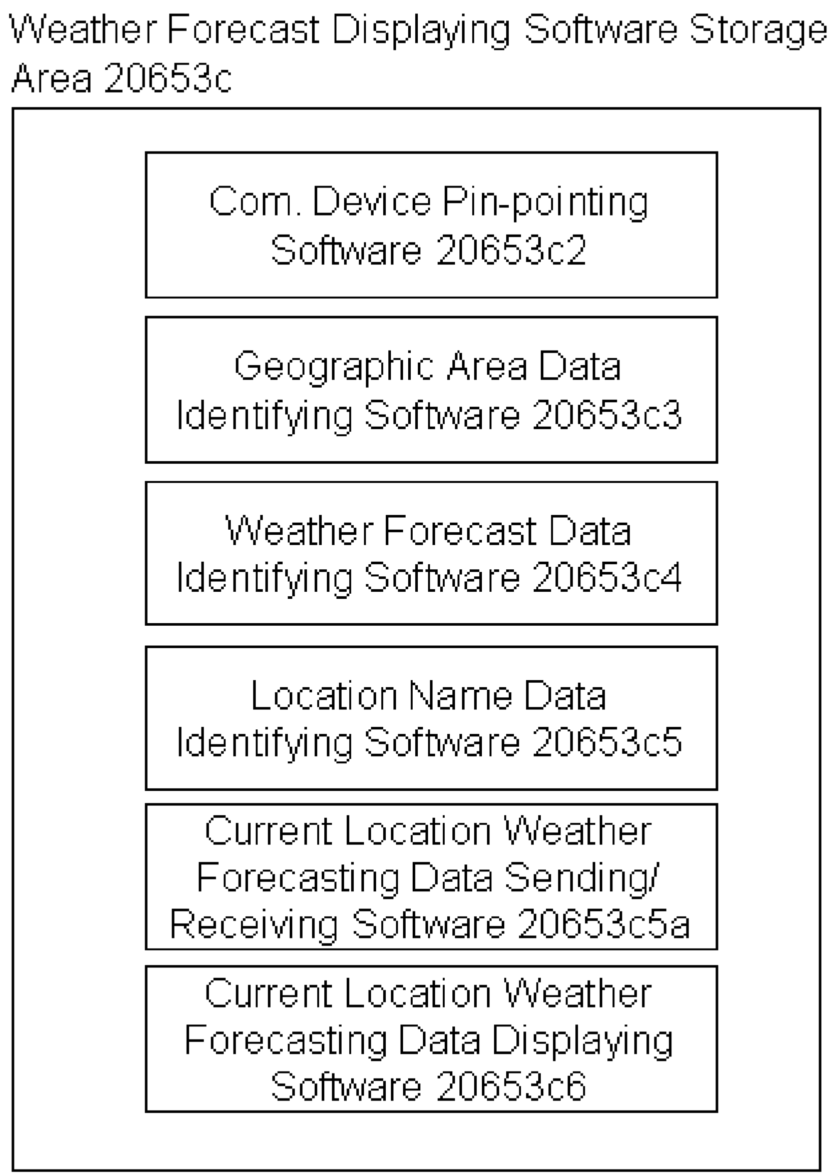

Fig. 1281
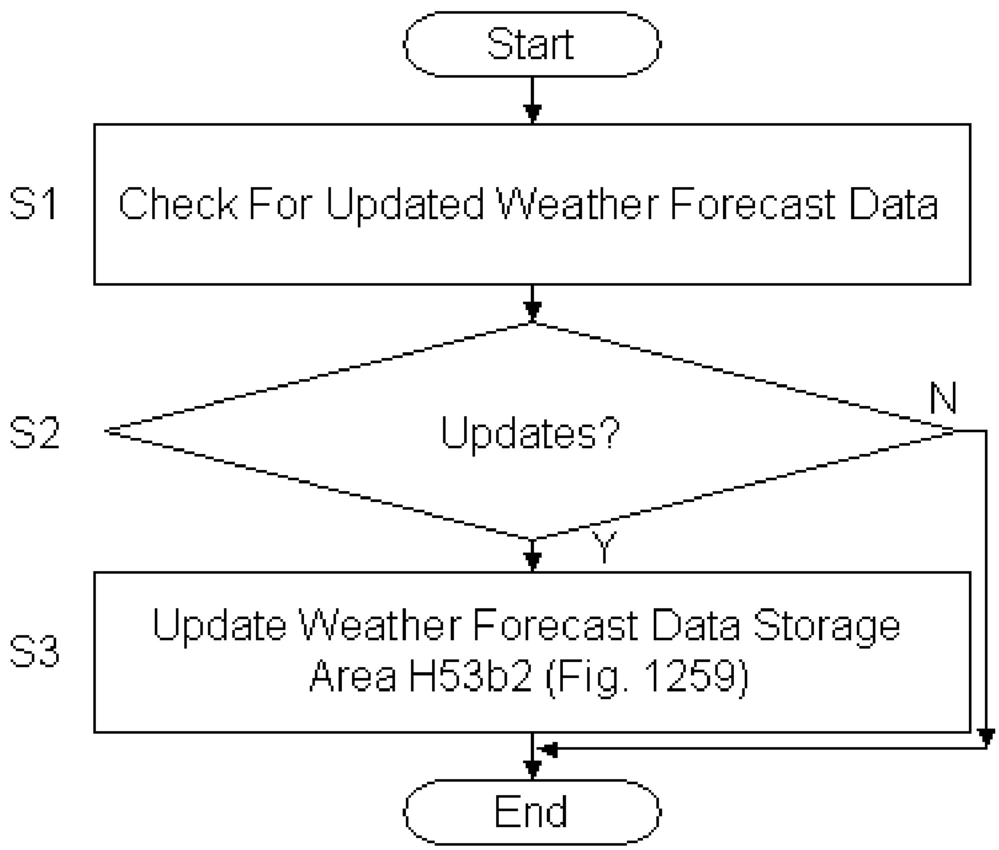

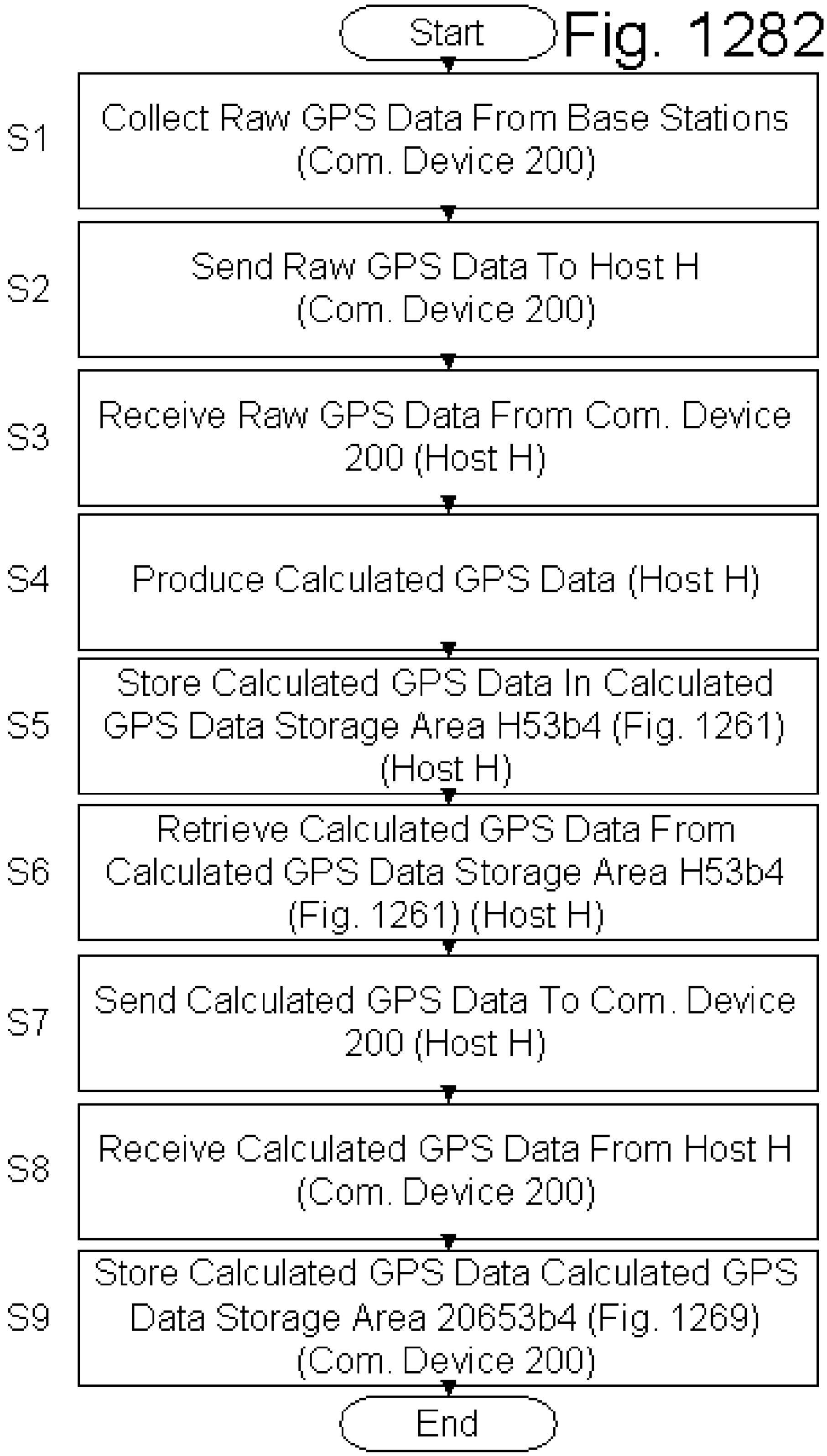
Fig. 1282

Fig. 1283
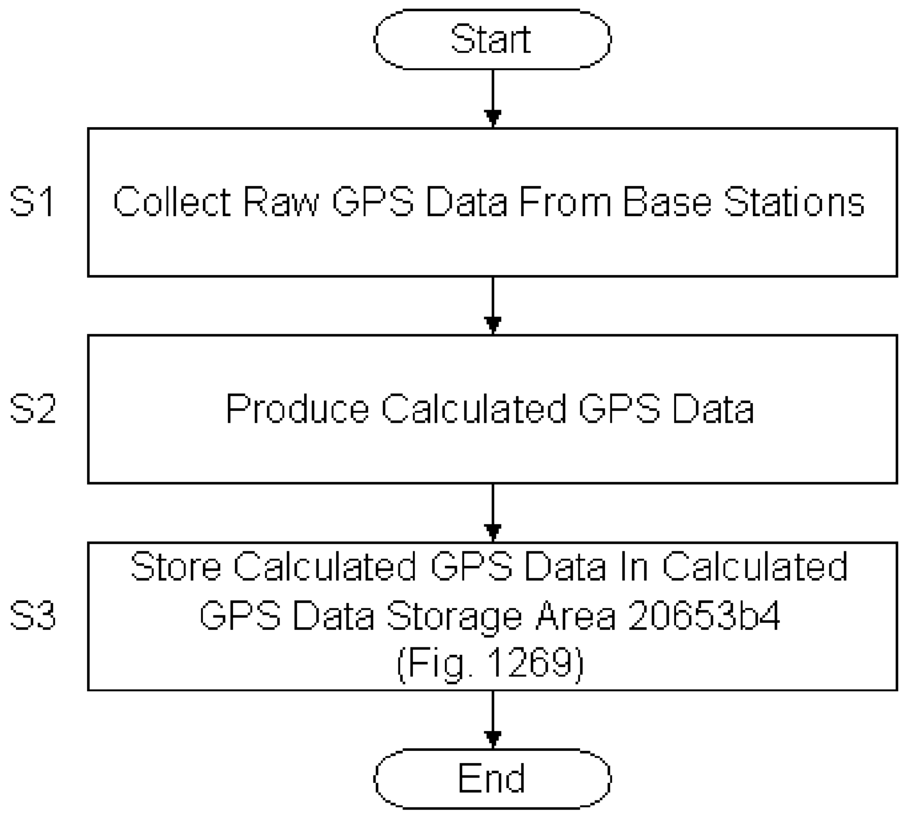

Fig. 1284
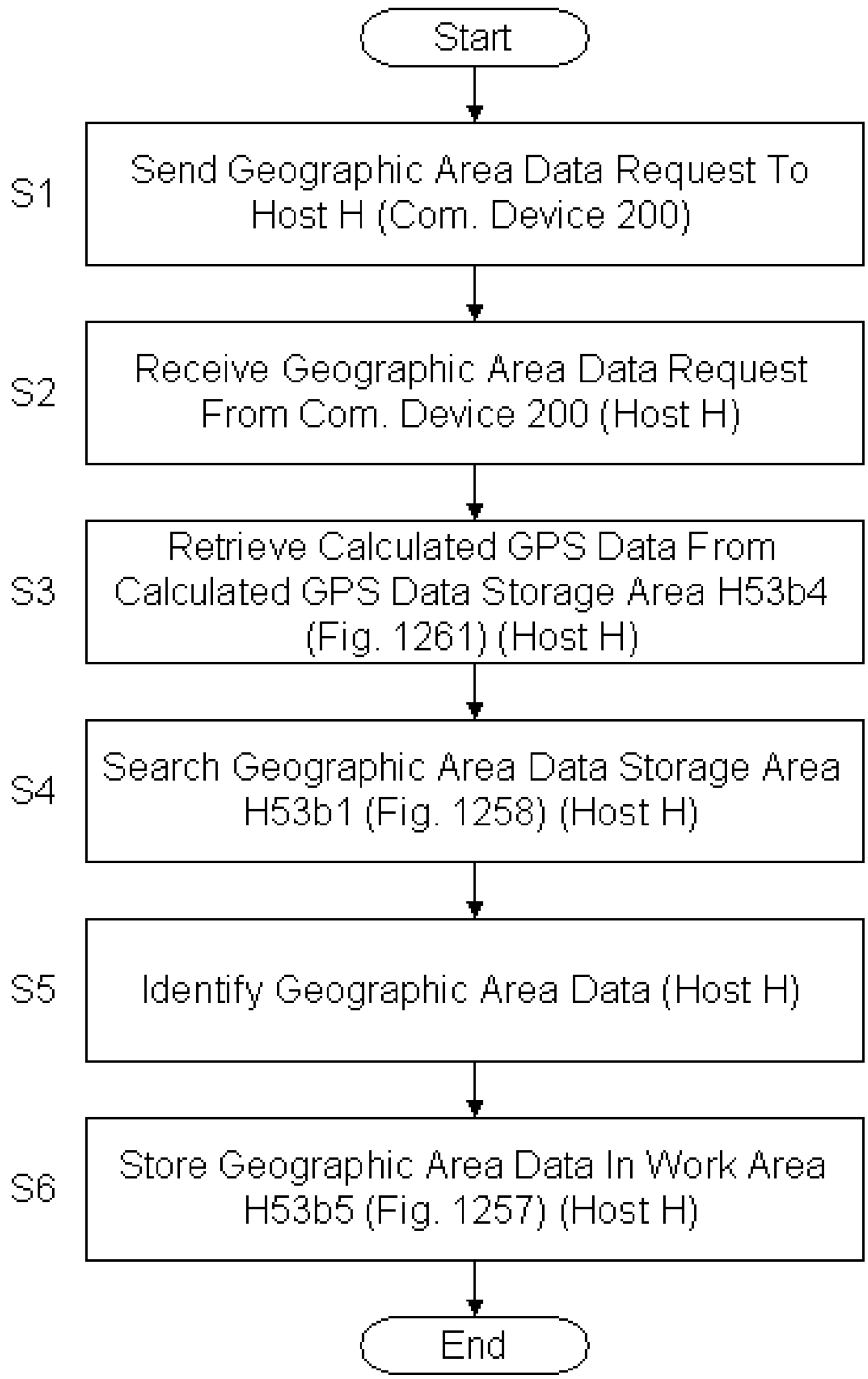

Fig. 1285
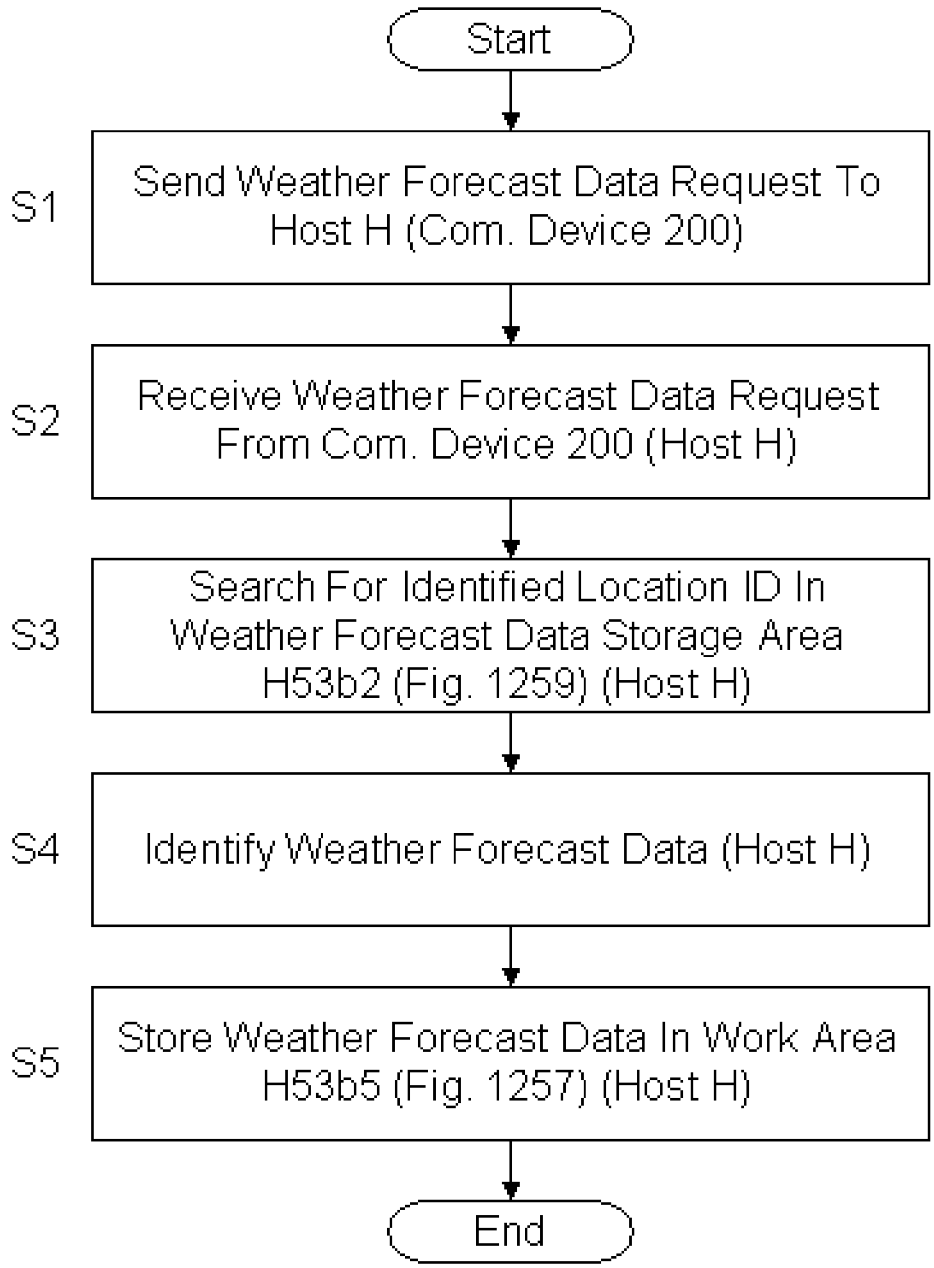

Fig. 1286
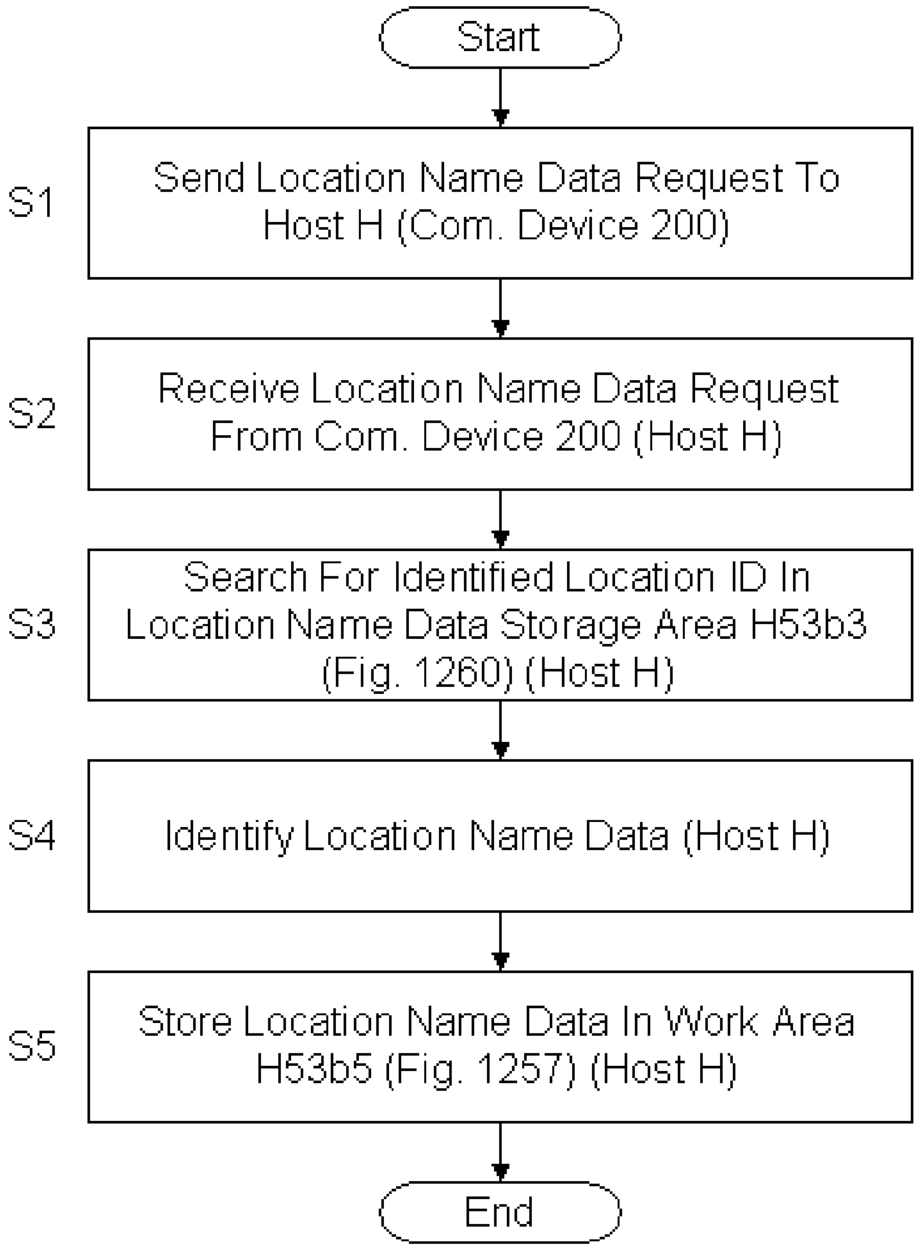

Fig. 1287
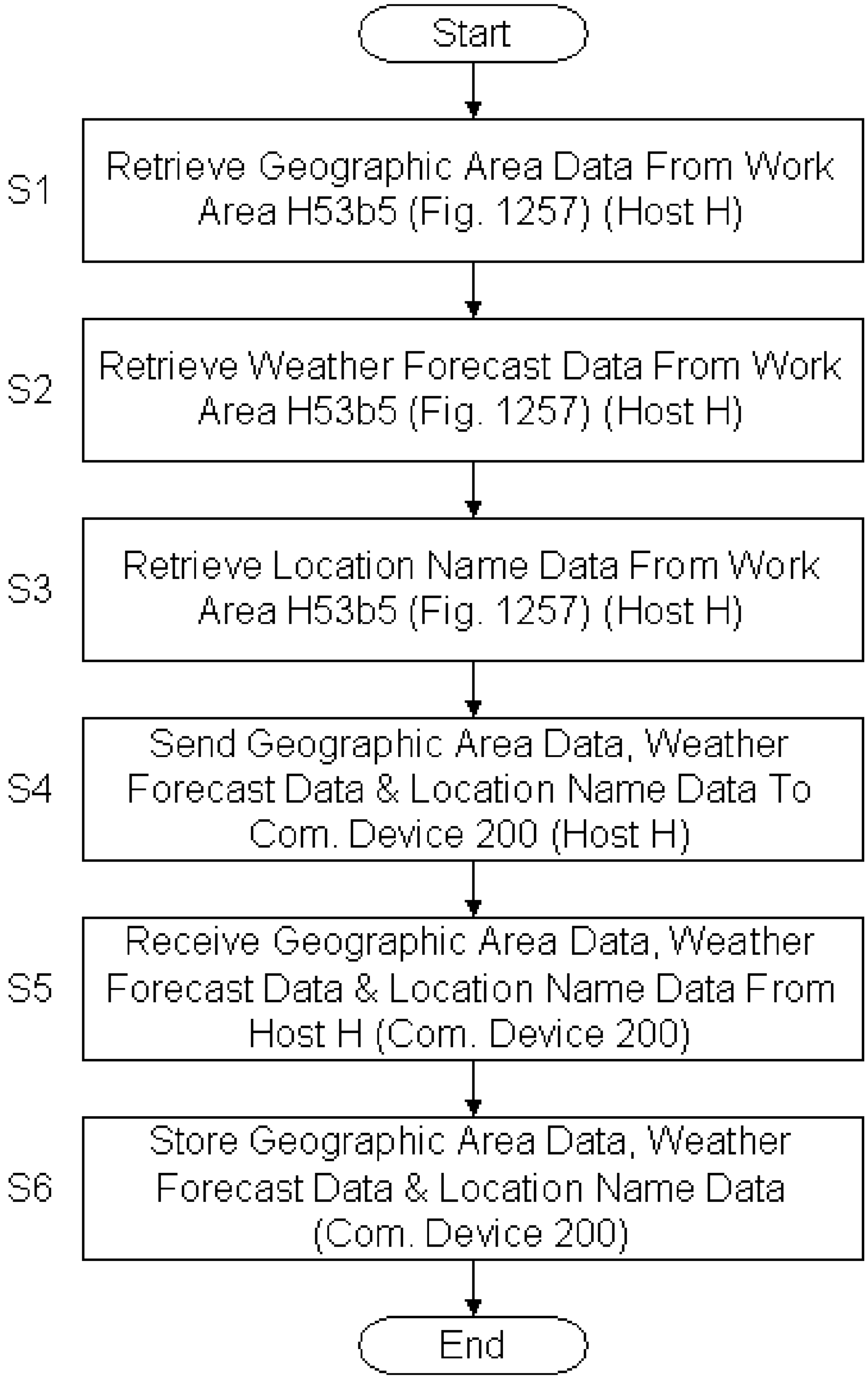

Fig. 1288
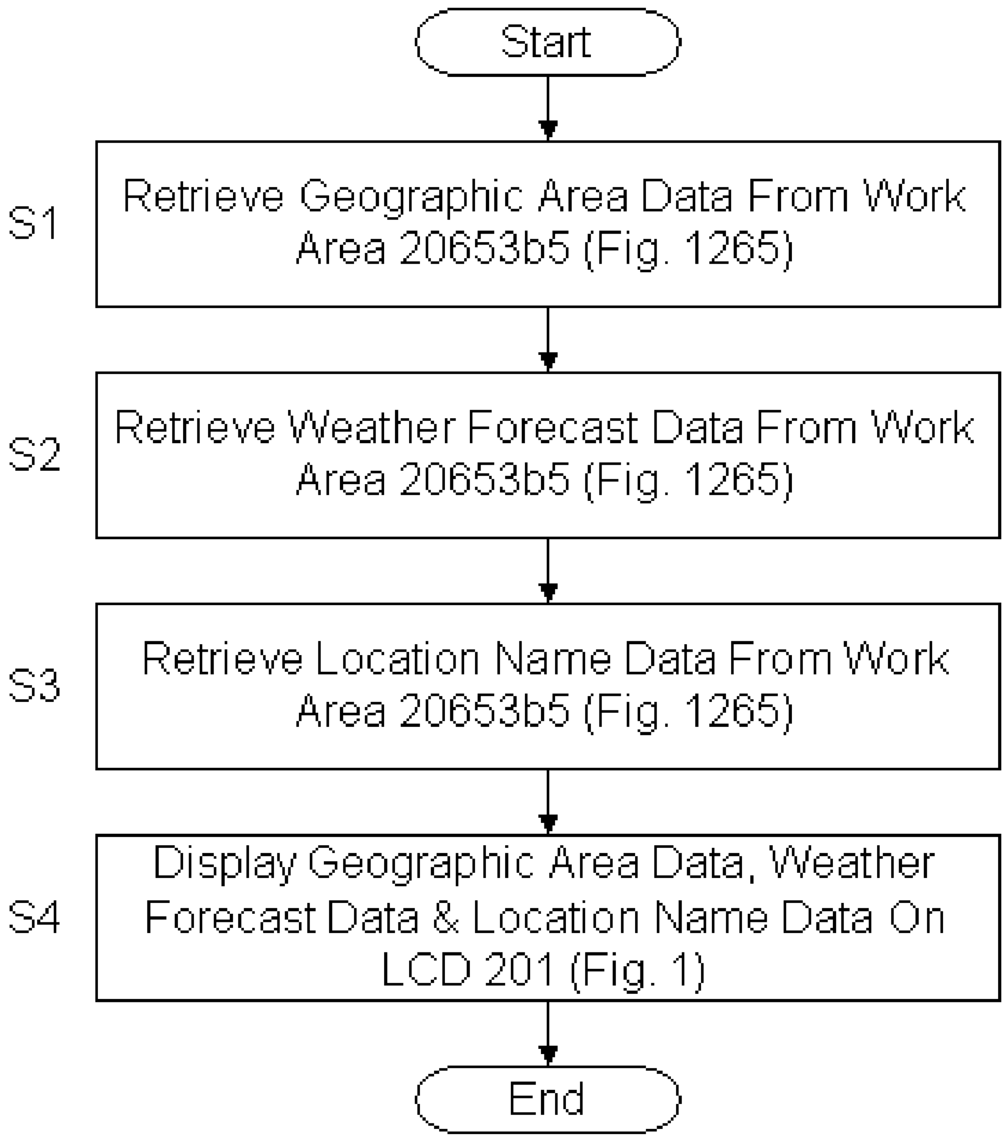

Fig. 1289
RAM 206
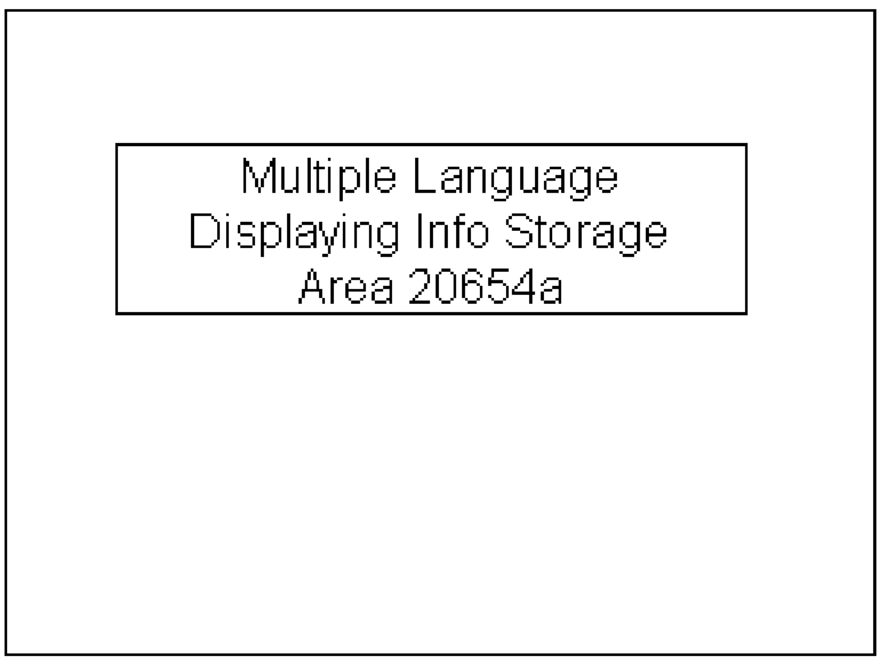

Fig. 1290
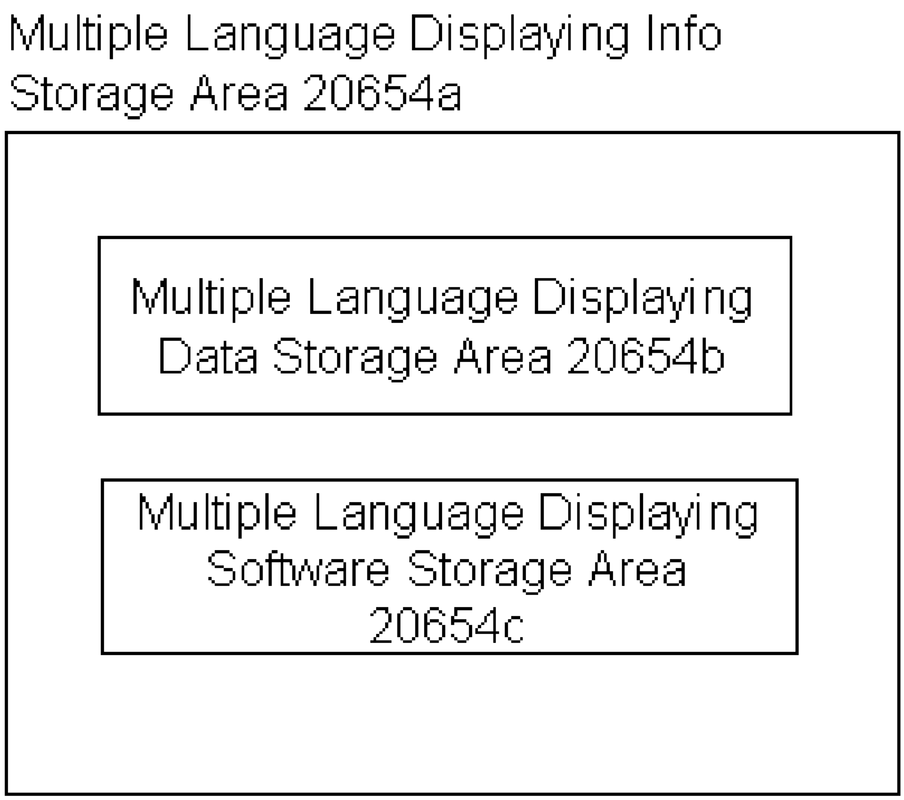

Fig. 1291
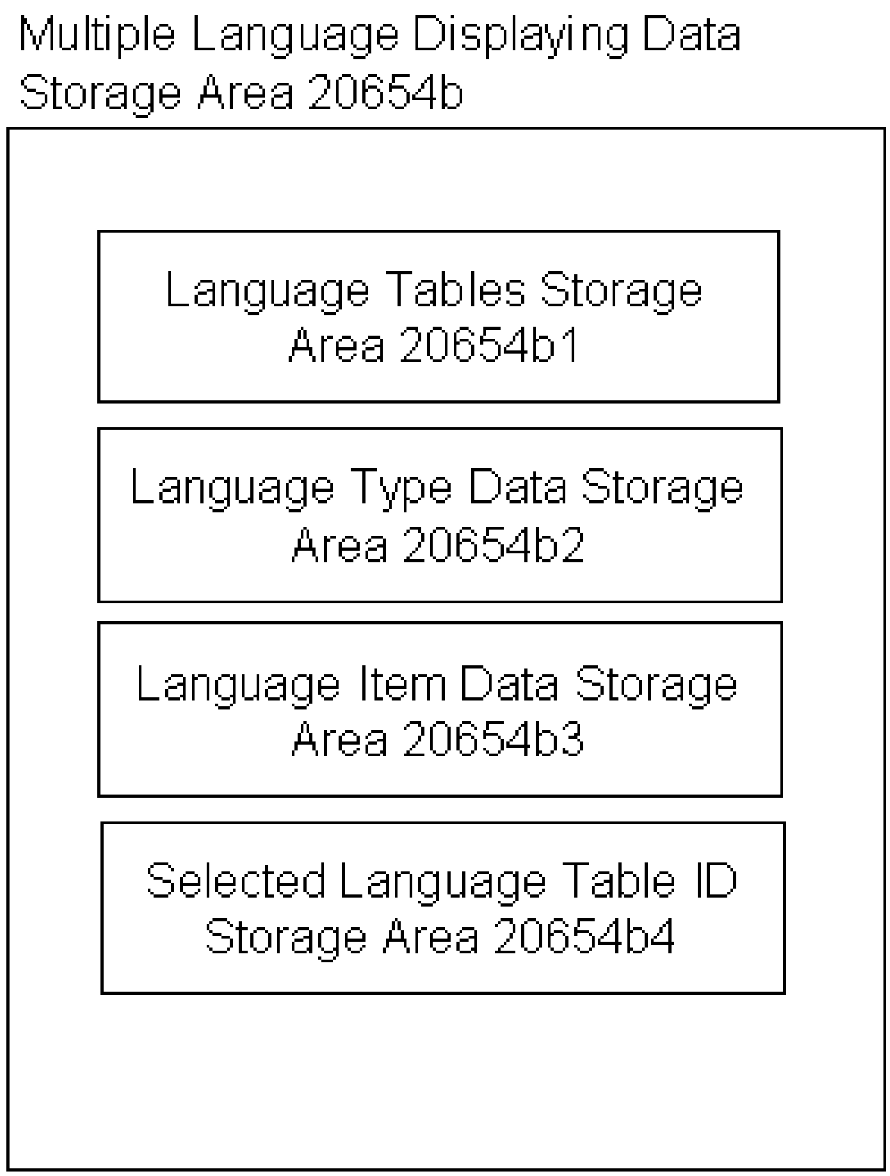

Fig. 1292
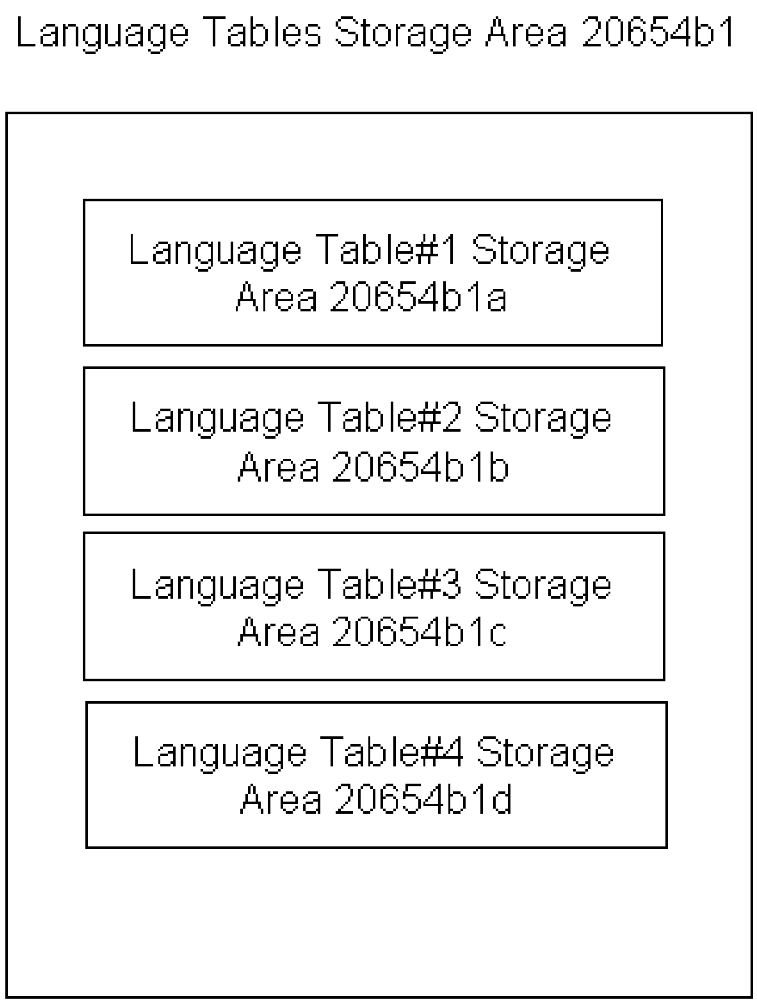

Fig. 1293

Language Table#1 Storage Area
20654b1a

| Language Item ID | Language Text |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 1294

Language Table#2 Storage Area
20654b1b

| Language Item ID | Language Text |
|---|---|
| Language Item#1 | 開く |
| Language Item#2 | 閉じる |
| Language Item#3 | 削除 |
| Language Item#4 | コピー |
| Language Item#5 | 切り取り |
| Language Item#6 | 貼り付け |
| Language Item#7 | 挿入 |
| Language Item#8 | ファイル |
| Language Item#9 | 編集 |
| Language Item#10 | 表示 |
| Language Item#11 | 書式 |
| Language Item#12 | ツール |
| Language Item#13 | ウィンドウ |
| Language Item#14 | ヘルプ |
| Language Item#15 | マイ ネットワーク |
| Language Item#16 | ごみ箱 |
| Language Item#17 | ローカル ディスク |
| Language Item#18 | 保存 |
| Language Item#19 | はい |
| Language Item#20 | いいえ |
| Language Item#21 | キャンセル |

Fig. 1295

Language Table#3 Storage Area
20654b1c

| Language Item ID | Language Text |
| --- | --- |
| Language Item#1 | French#1 |
| Language Item#2 | French#2 |
| Language Item#3 | French#3 |
| Language Item#4 | French#4 |
| Language Item#5 | French#5 |
| Language Item#6 | French#6 |
| Language Item#7 | French#7 |
| Language Item#8 | French#8 |
| Language Item#9 | French#9 |
| Language Item#10 | French#10 |
| Language Item#11 | French#11 |
| Language Item#12 | French#12 |
| Language Item#13 | French#13 |
| Language Item#14 | French#14 |
| Language Item#15 | French#15 |
| Language Item#16 | French#16 |
| Language Item#17 | French#17 |
| Language Item#18 | French#18 |
| Language Item#19 | French#19 |
| Language Item#20 | French#20 |
| Language Item#21 | French#21 |

Fig. 1296

Language Table#4 Storage Area
20654b1d

| Language Item ID | Language Text |
|---|---|
| Language Item#1 | German#1 |
| Language Item#2 | German#2 |
| Language Item#3 | German#3 |
| Language Item#4 | German#4 |
| Language Item#5 | German#5 |
| Language Item#6 | German#6 |
| Language Item#7 | German#7 |
| Language Item#8 | German#8 |
| Language Item#9 | German#9 |
| Language Item#10 | German#10 |
| Language Item#11 | German#11 |
| Language Item#12 | German#12 |
| Language Item#13 | German#13 |
| Language Item#14 | German#14 |
| Language Item#15 | German#15 |
| Language Item#16 | German#16 |
| Language Item#17 | German#17 |
| Language Item#18 | German#18 |
| Language Item#19 | German#19 |
| Language Item#20 | German#20 |
| Language Item#21 | German#21 |

Fig. 1297

Language Type Data Storage Area
20654b2

| Language Table ID | Language Type |
|---|---|
| Language Table#1 | English |
| Language Table#2 | Japanese |
| Language Table#3 | French |
| Language Table#4 | German |

Fig. 1298

Language Item Data Storage Area 20654b3

| Language Item ID | Language Item |
|---|---|
| Language Item#1 | Open file |
| Language Item#2 | Close file |
| Language Item#3 | Delete |
| Language Item#4 | Copy |
| Language Item#5 | Cut |
| Language Item#6 | Paste |
| Language Item#7 | Insert |
| Language Item#8 | File |
| Language Item#9 | Edit |
| Language Item#10 | View |
| Language Item#11 | Format |
| Language Item#12 | Tools |
| Language Item#13 | Window |
| Language Item#14 | Help |
| Language Item#15 | My Network |
| Language Item#16 | Trash |
| Language Item#17 | Local Disk |
| Language Item#18 | Save |
| Language Item#19 | Yes |
| Language Item#20 | No |
| Language Item#21 | Cancel |

Fig. 1299
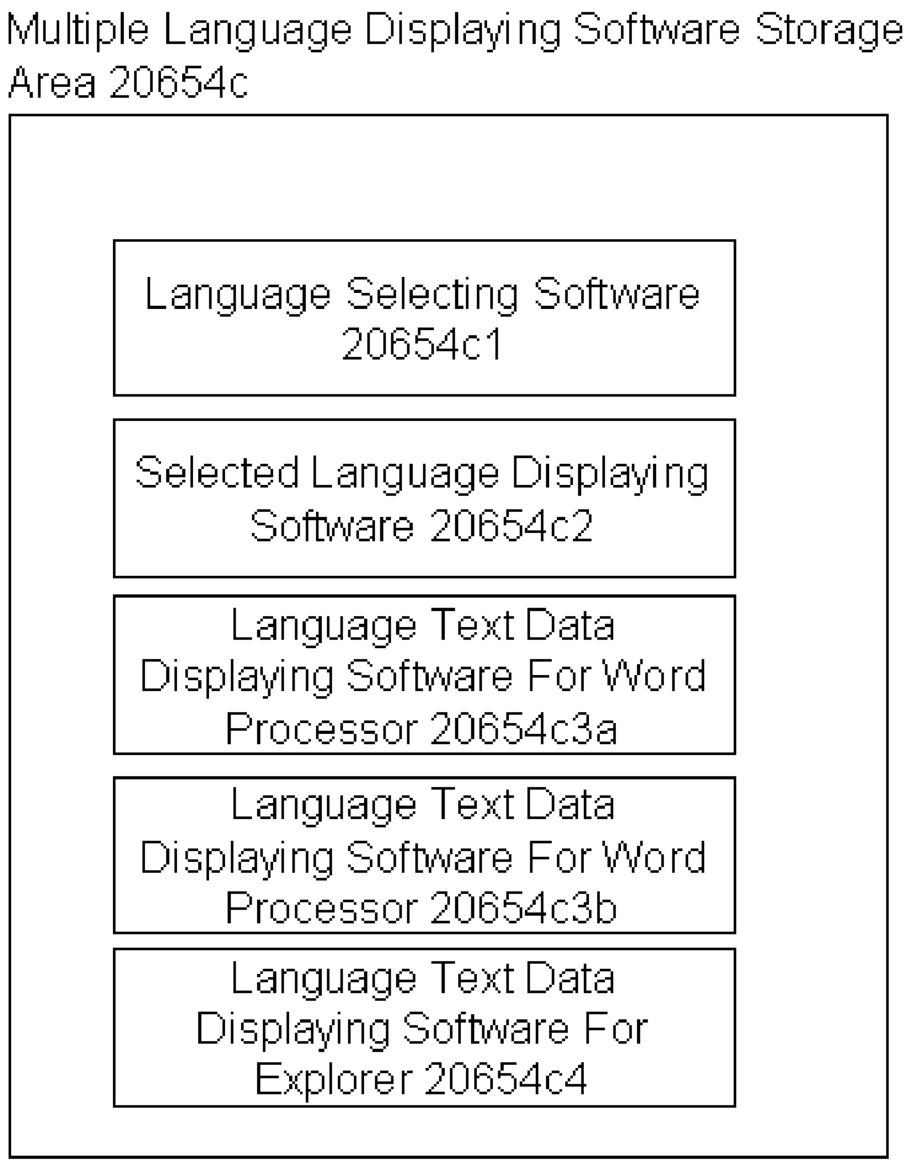

Fig. 1300
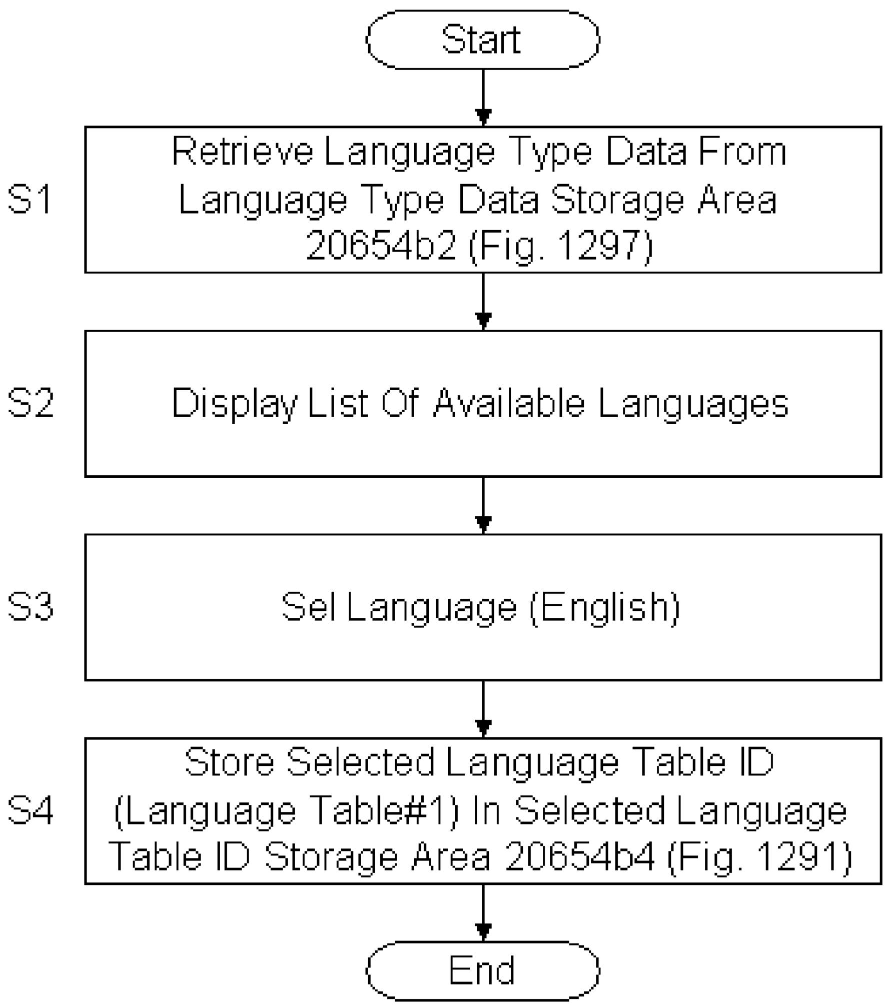

Fig. 1301
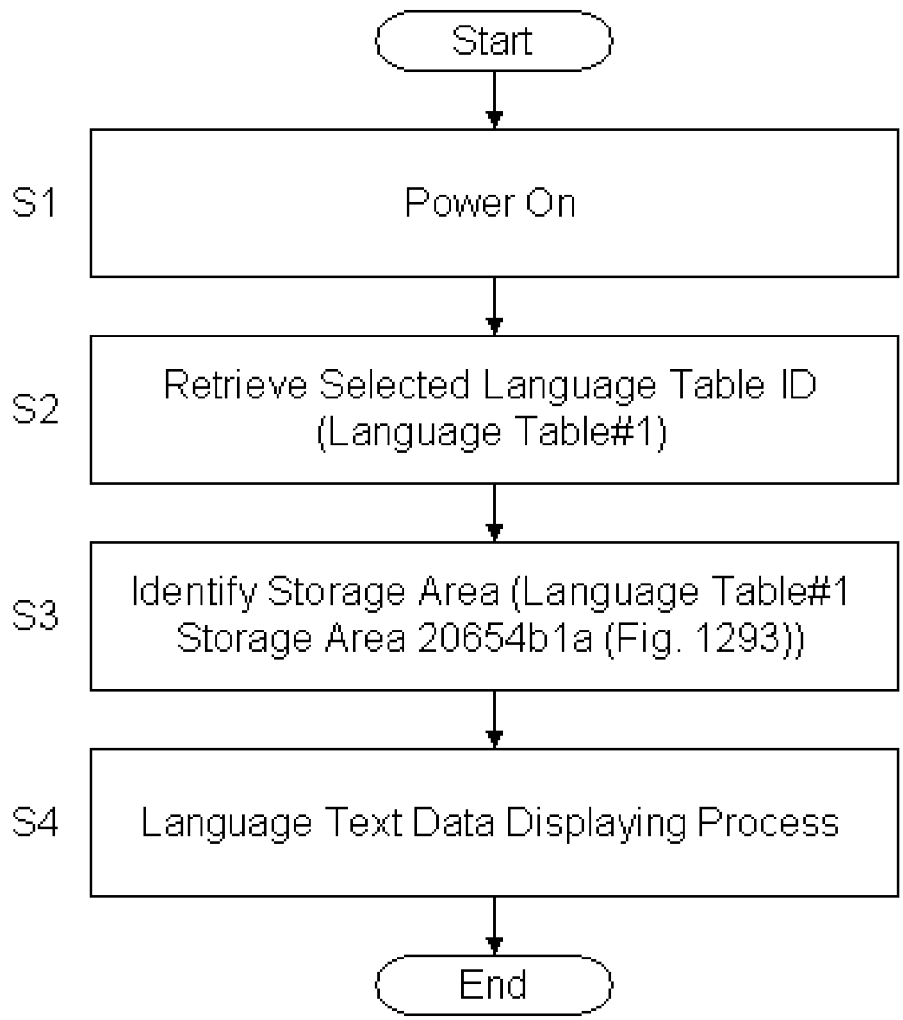

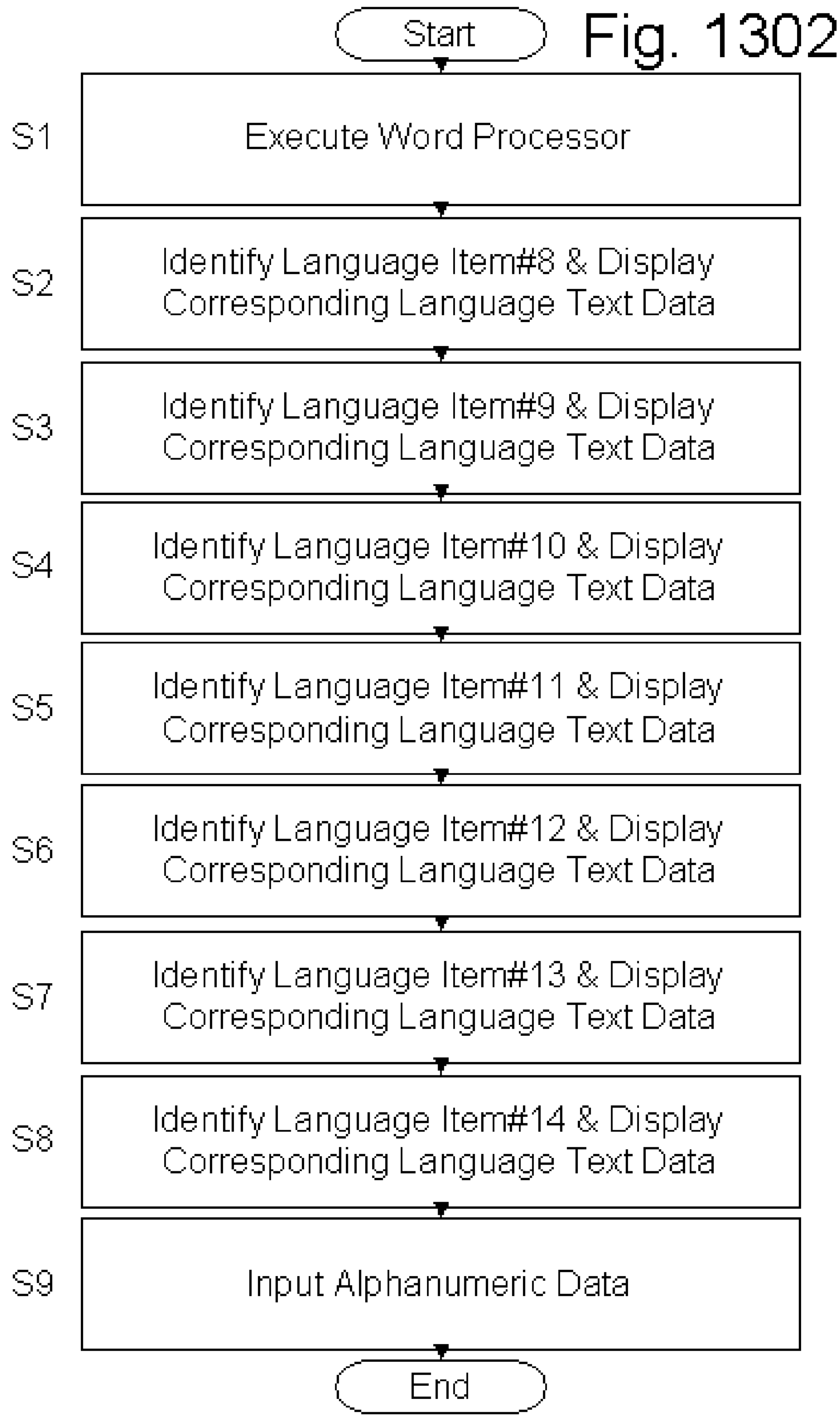
Fig. 1302

Fig. 1303
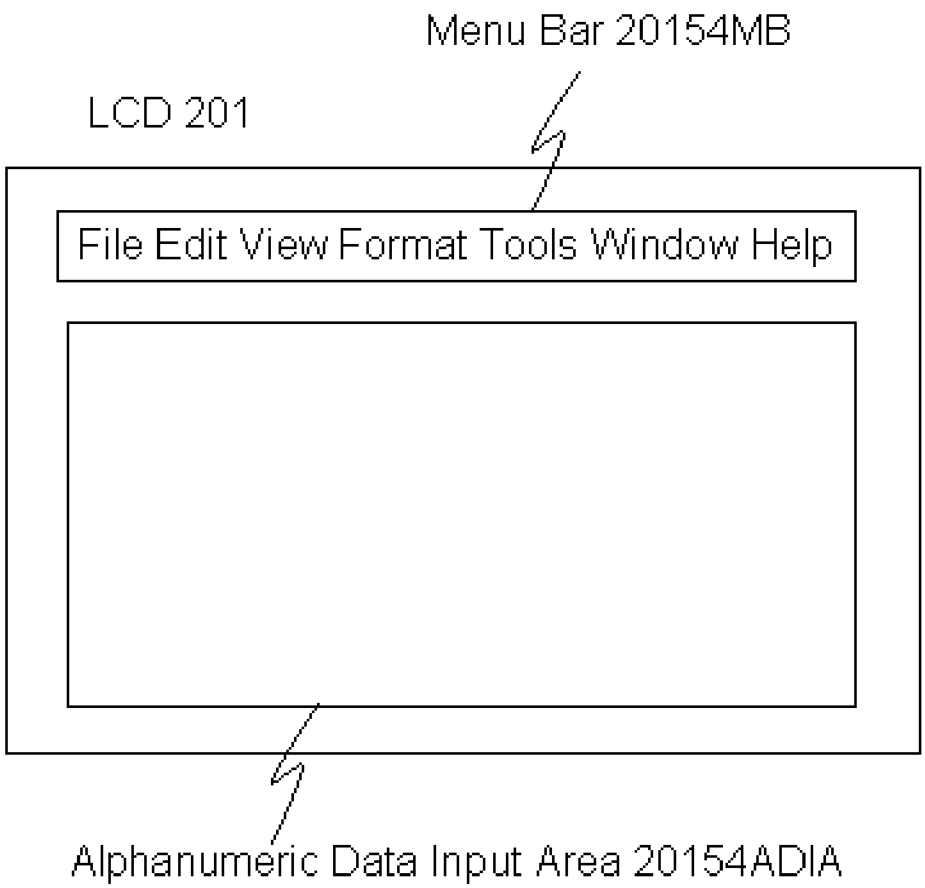
File → 20154MBF
Edit → 20154MBE
View → 20154MBV
Format → 20154MBF
Tools → 20154MBT
Window → 20154MBW
Help → 20154MBH Fig. 1304
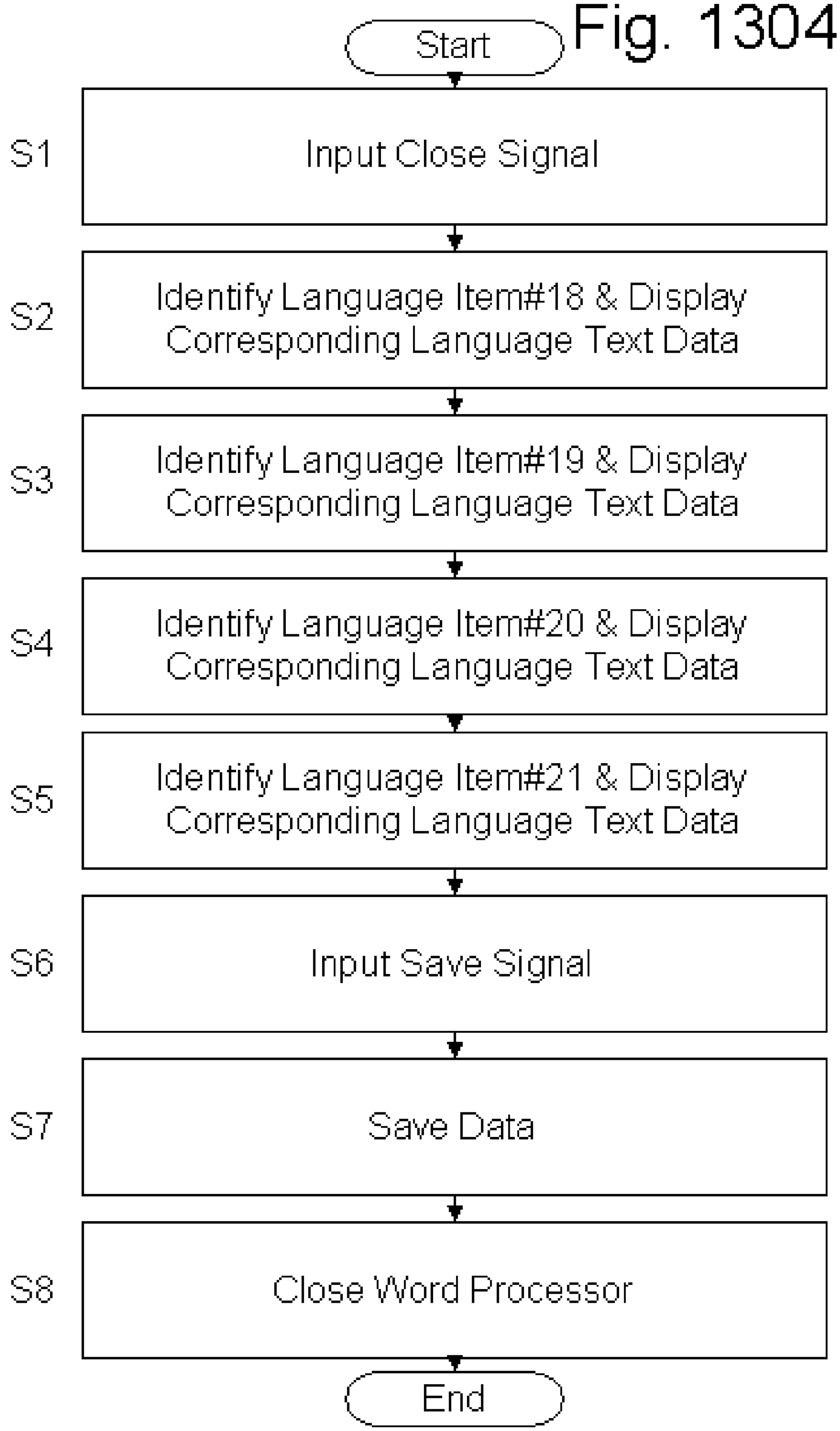

Fig. 1305
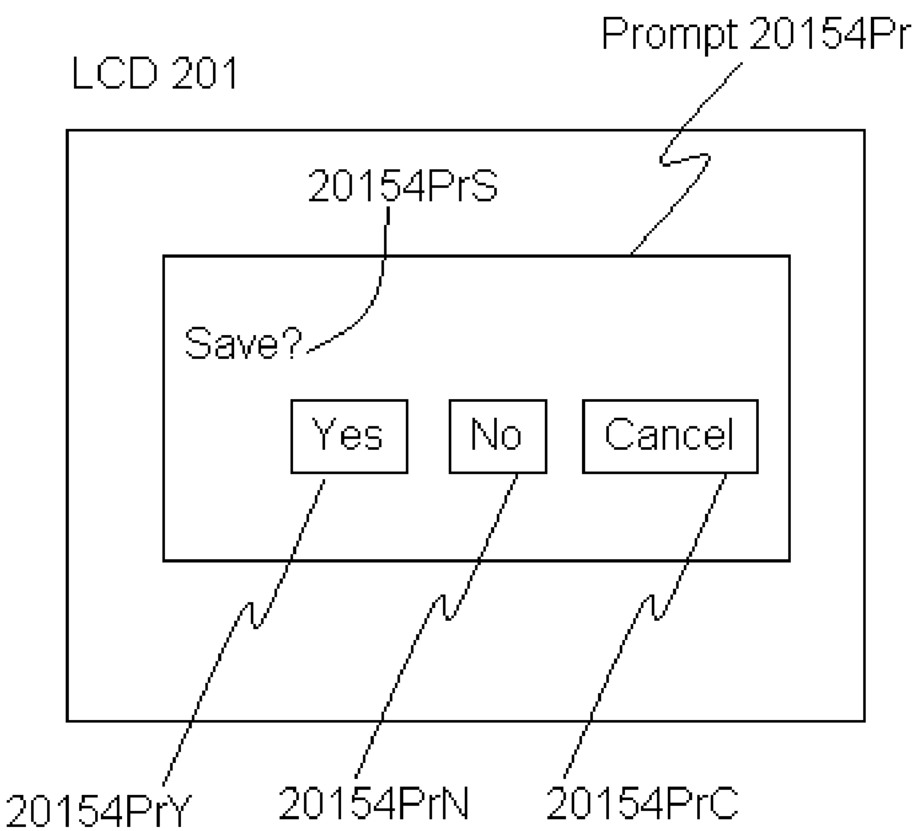

Fig. 1306
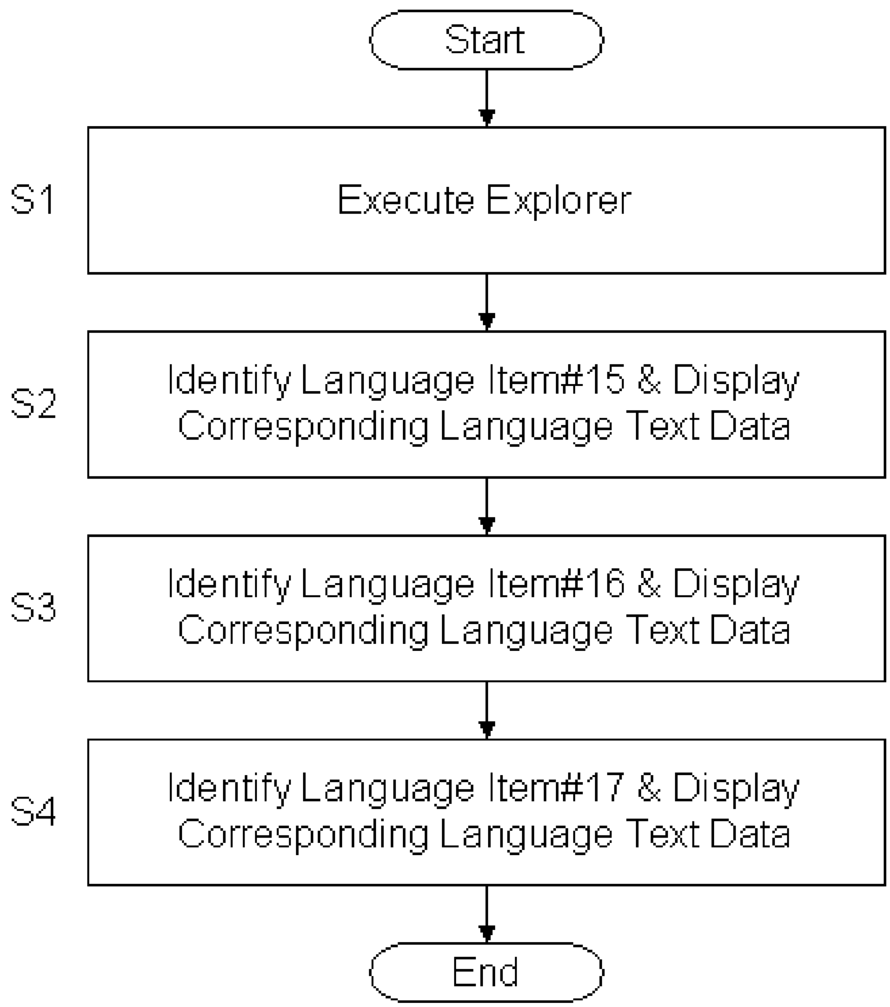

Fig. 1307
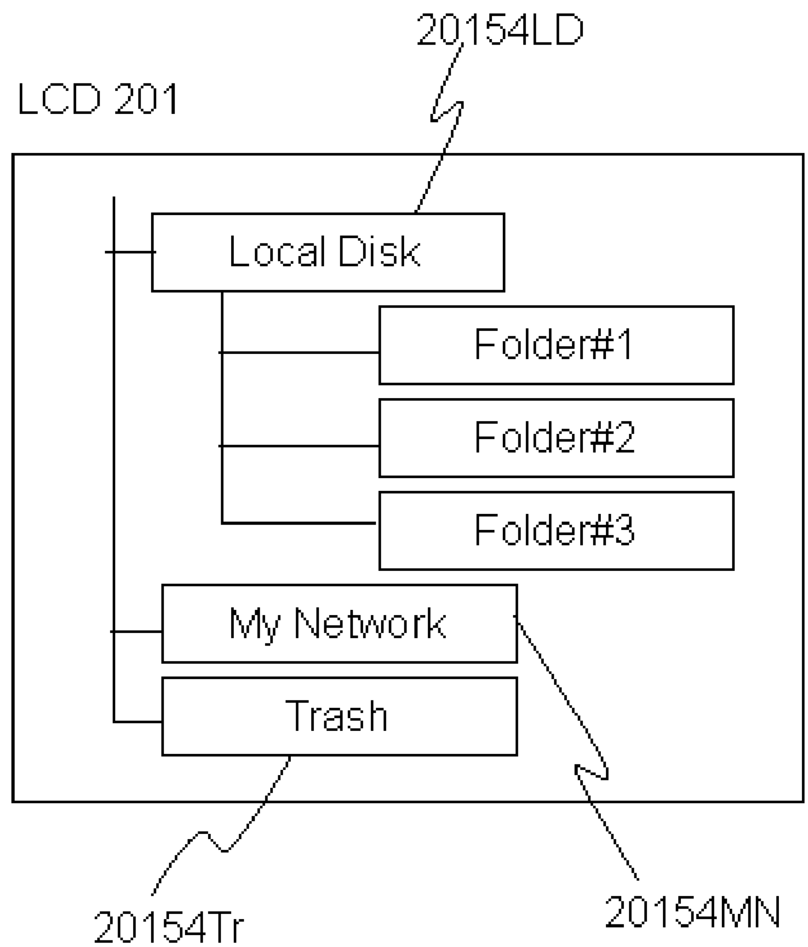

Fig. 1308
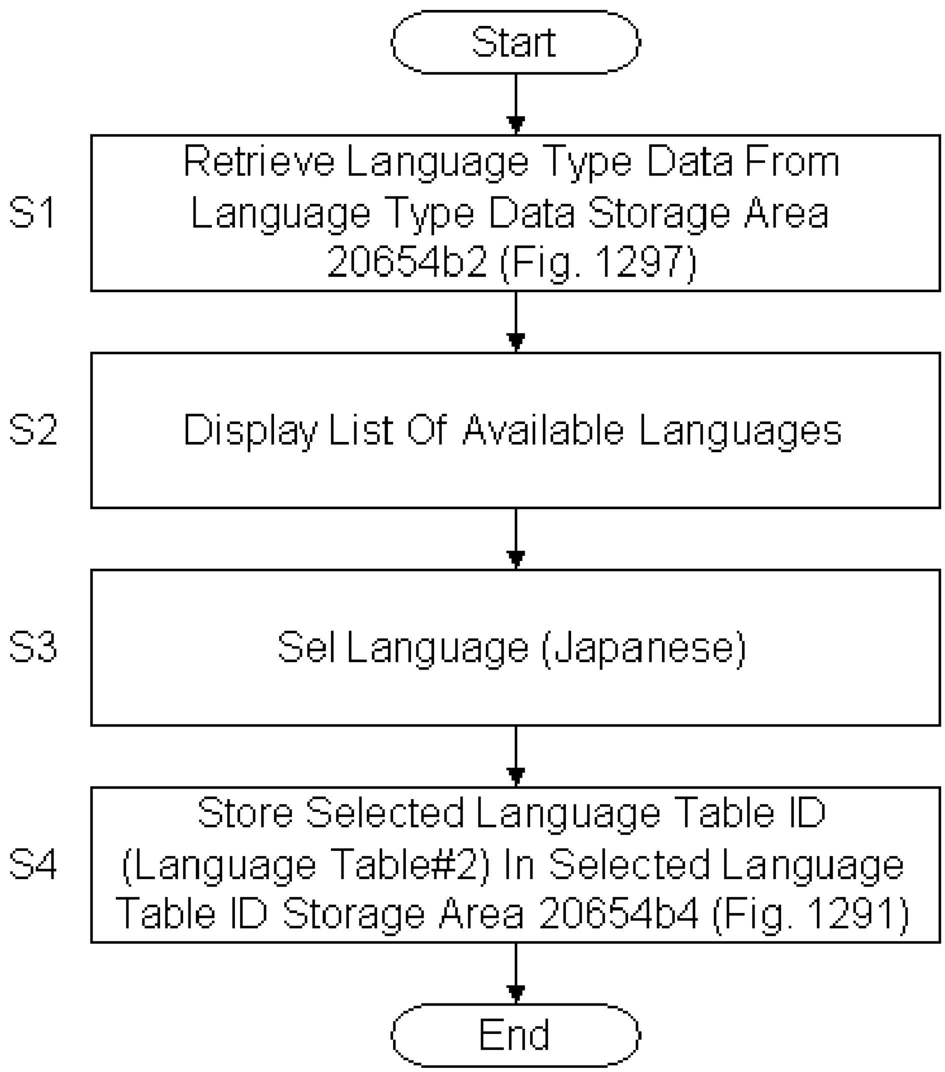

Fig. 1309
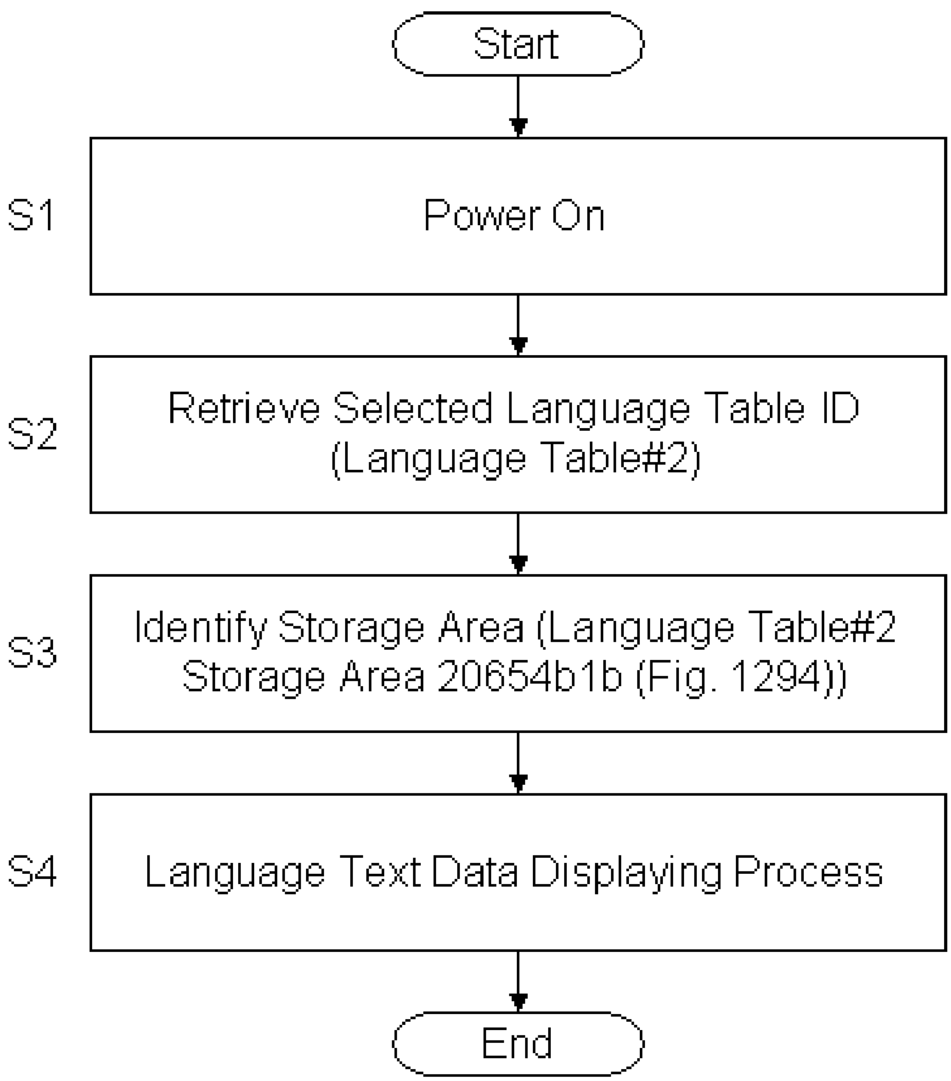

Fig. 1310
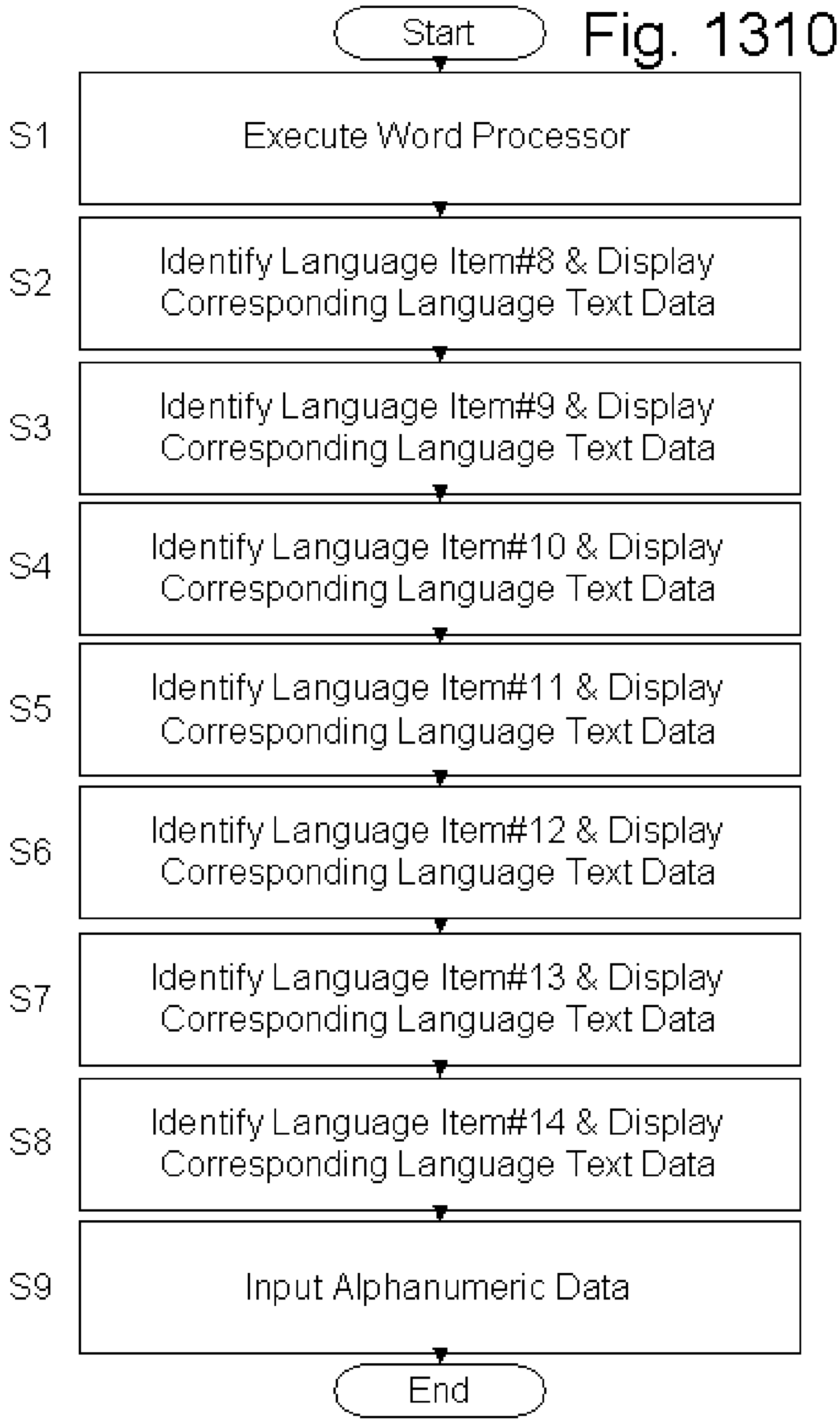

Fig. 1311
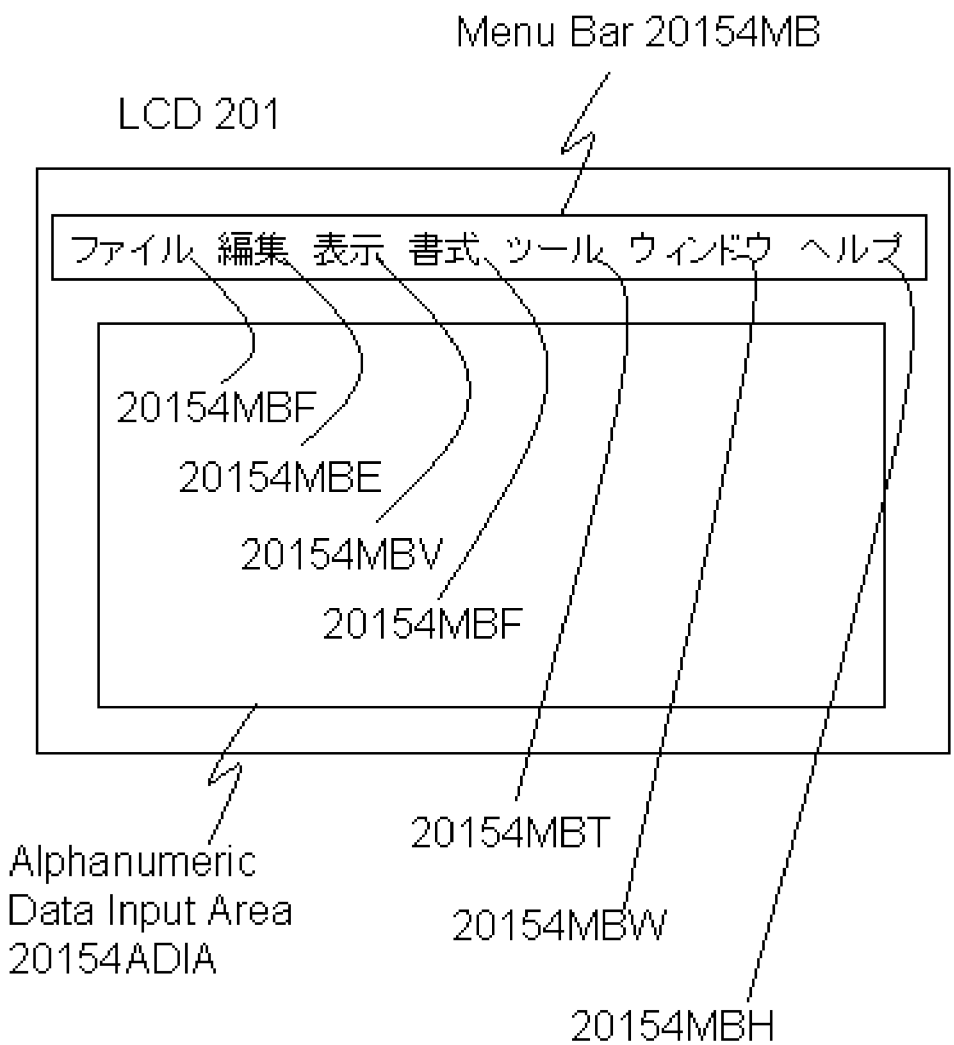

Fig. 1312
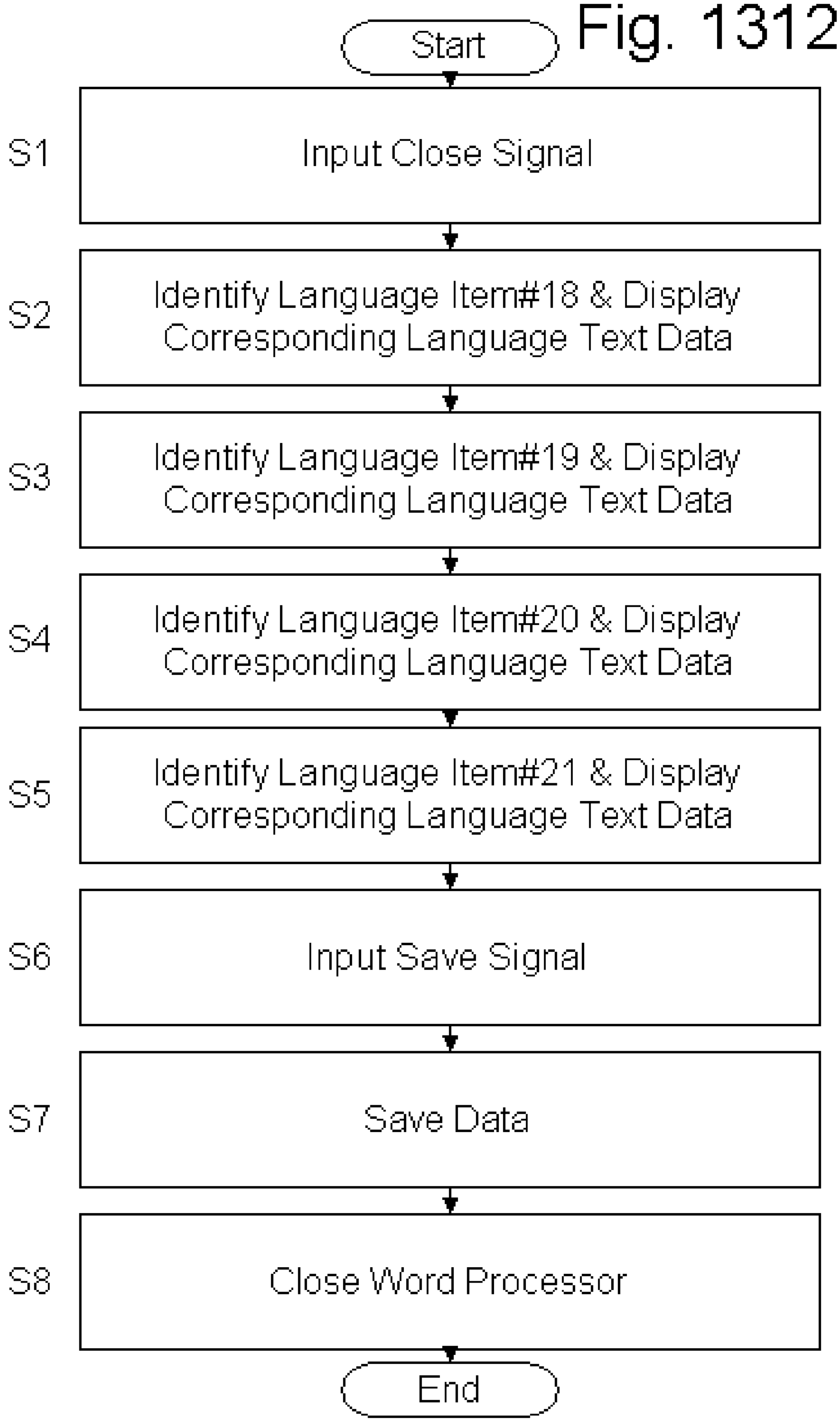

Fig. 1313
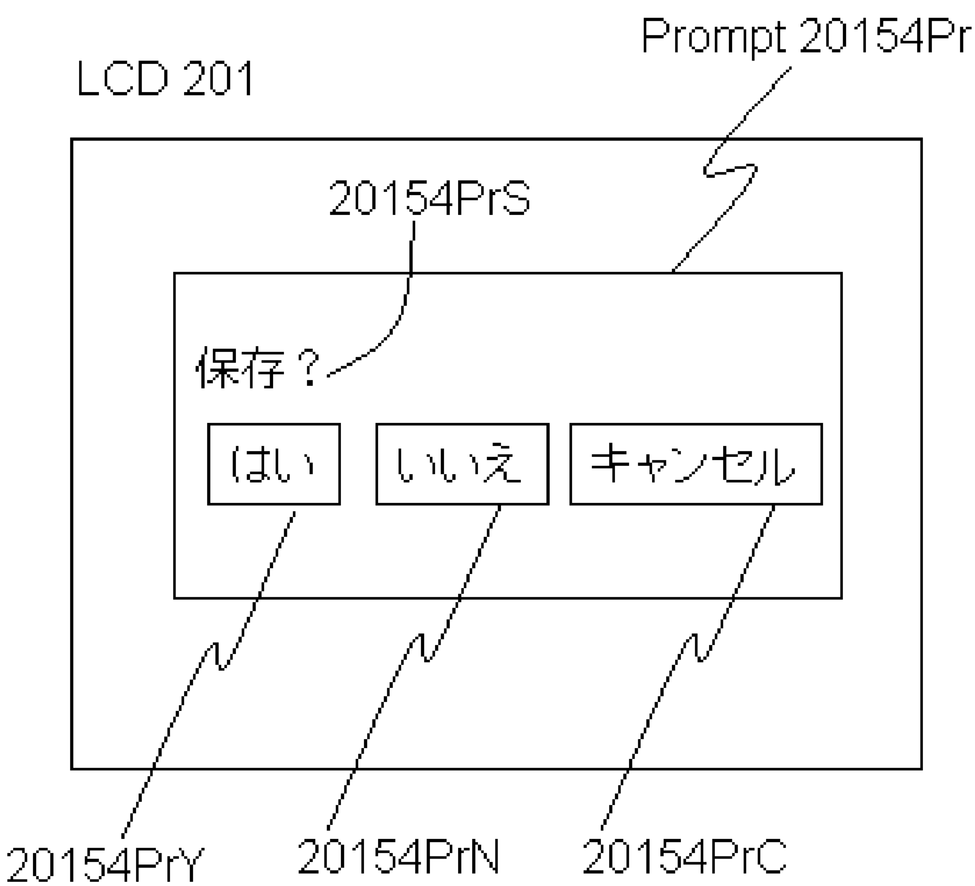

Fig. 1314
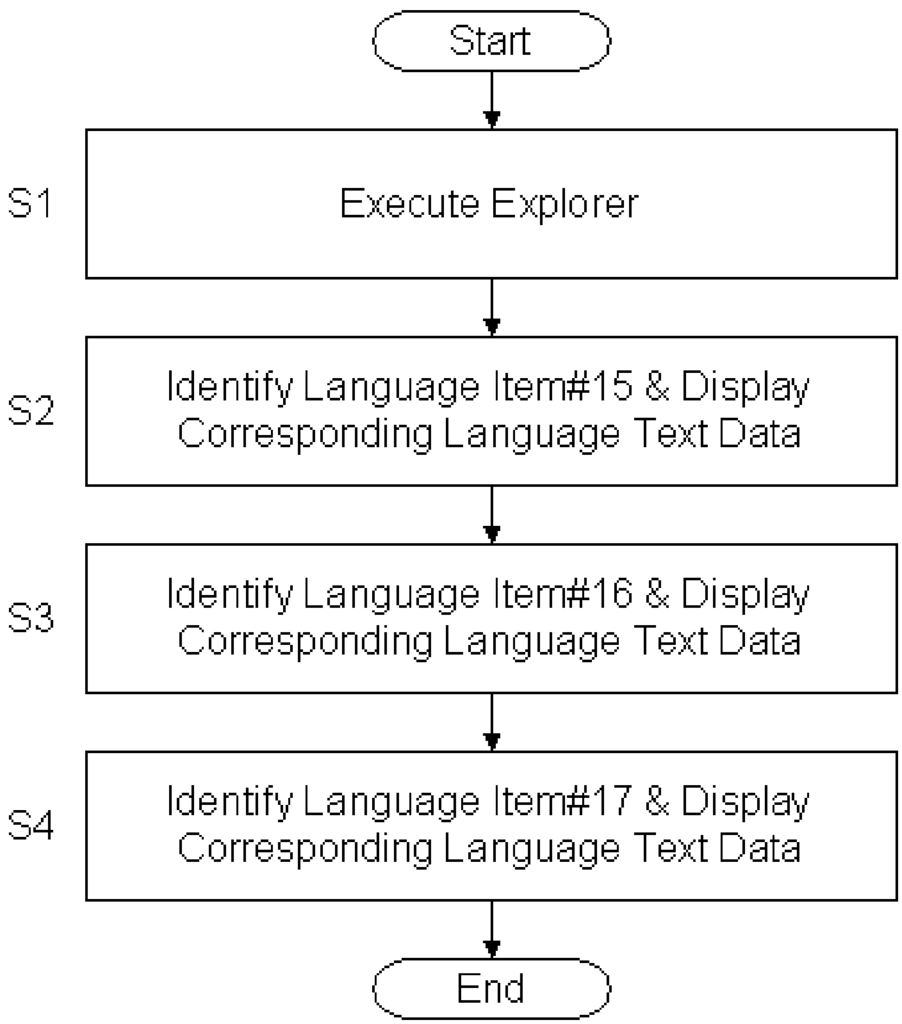

Fig. 1315
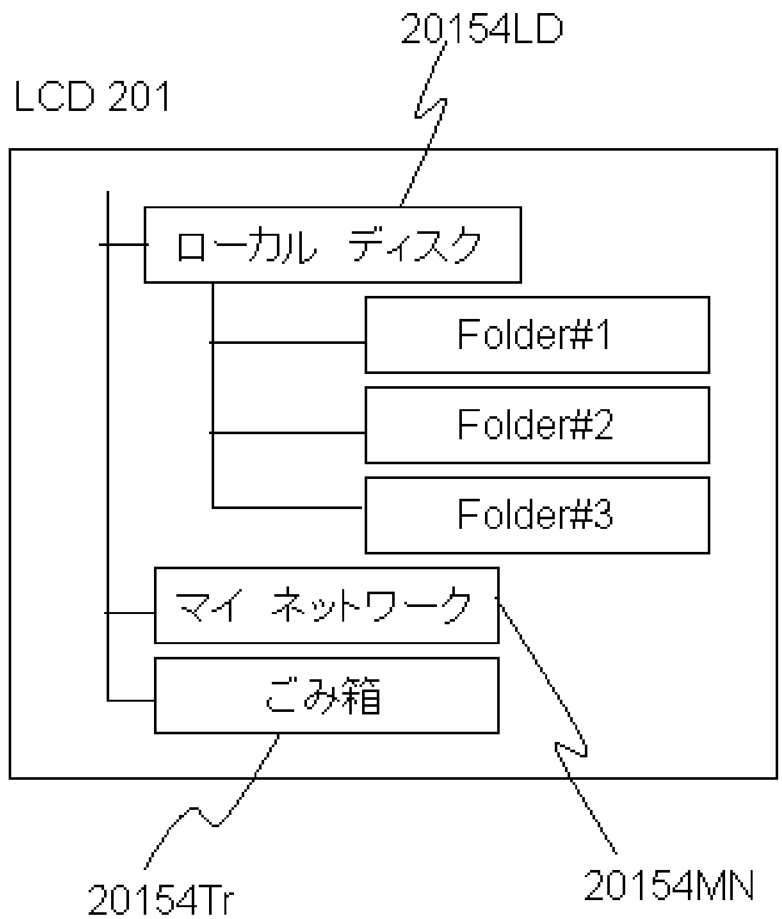

Fig. 1316
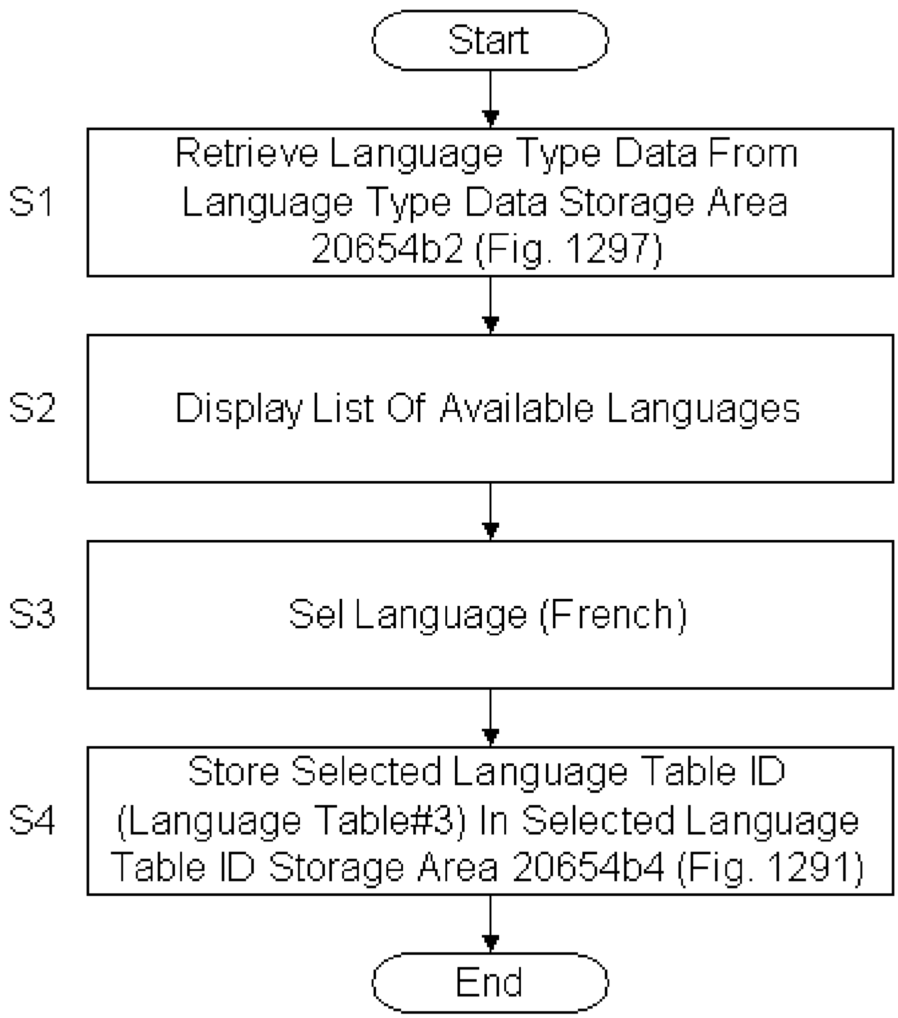

Fig. 1317
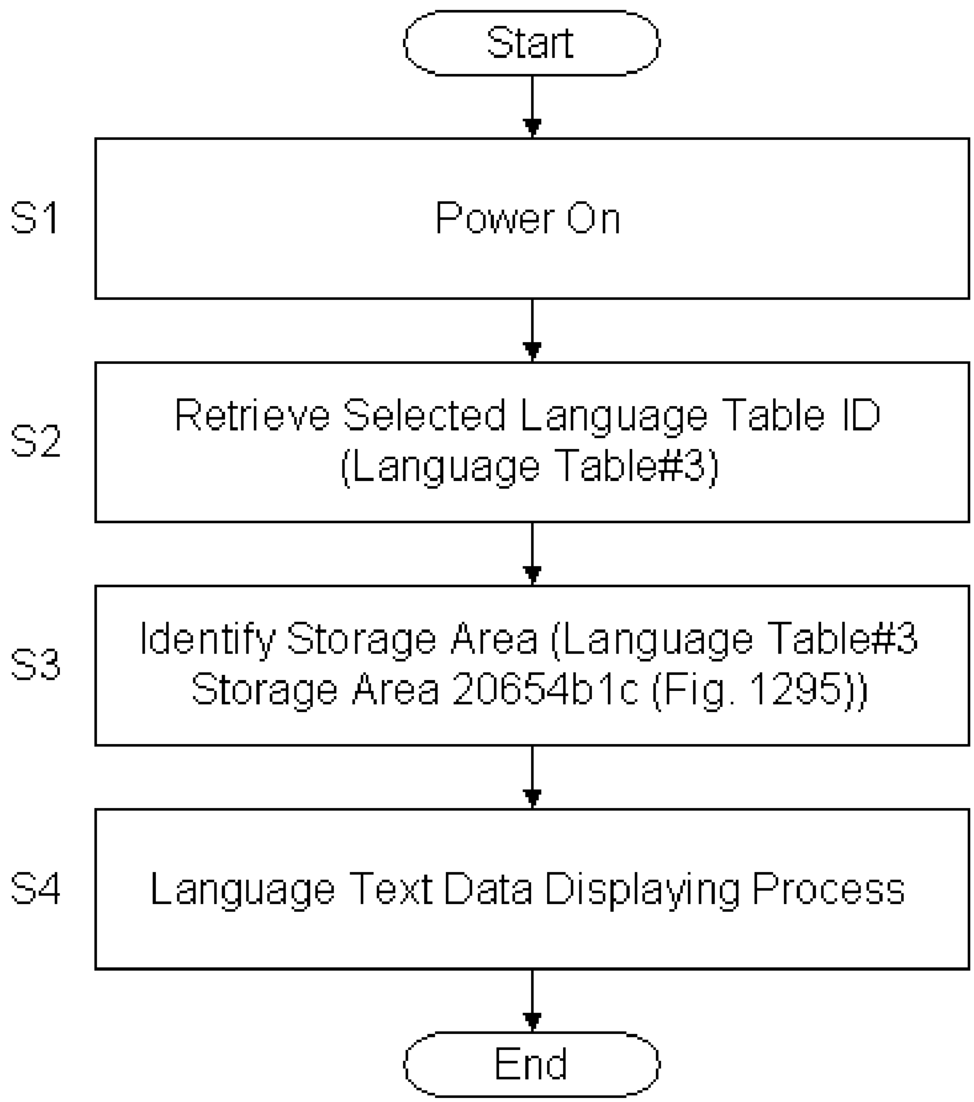

Fig. 1318
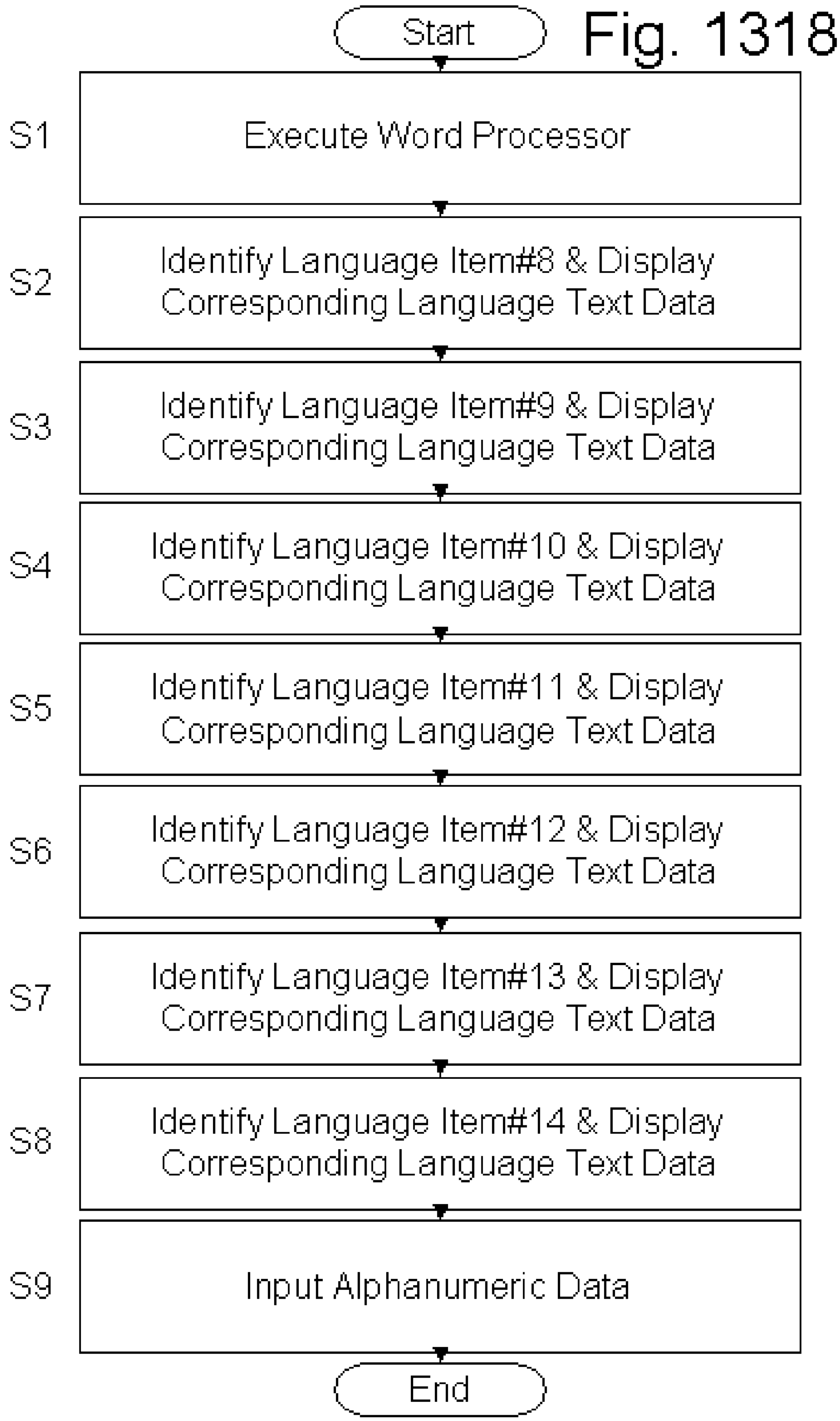

Fig. 1319
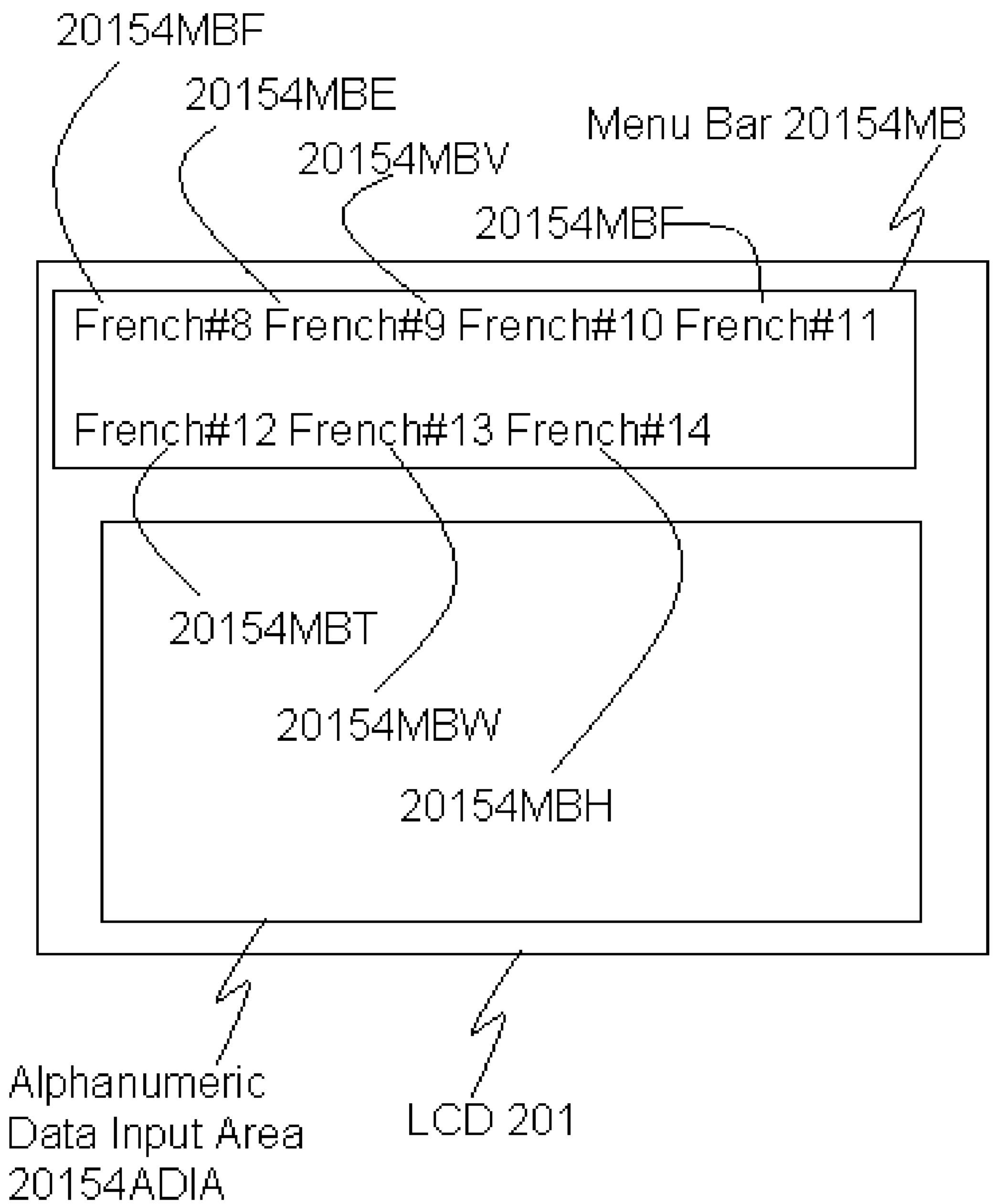

Fig. 1320
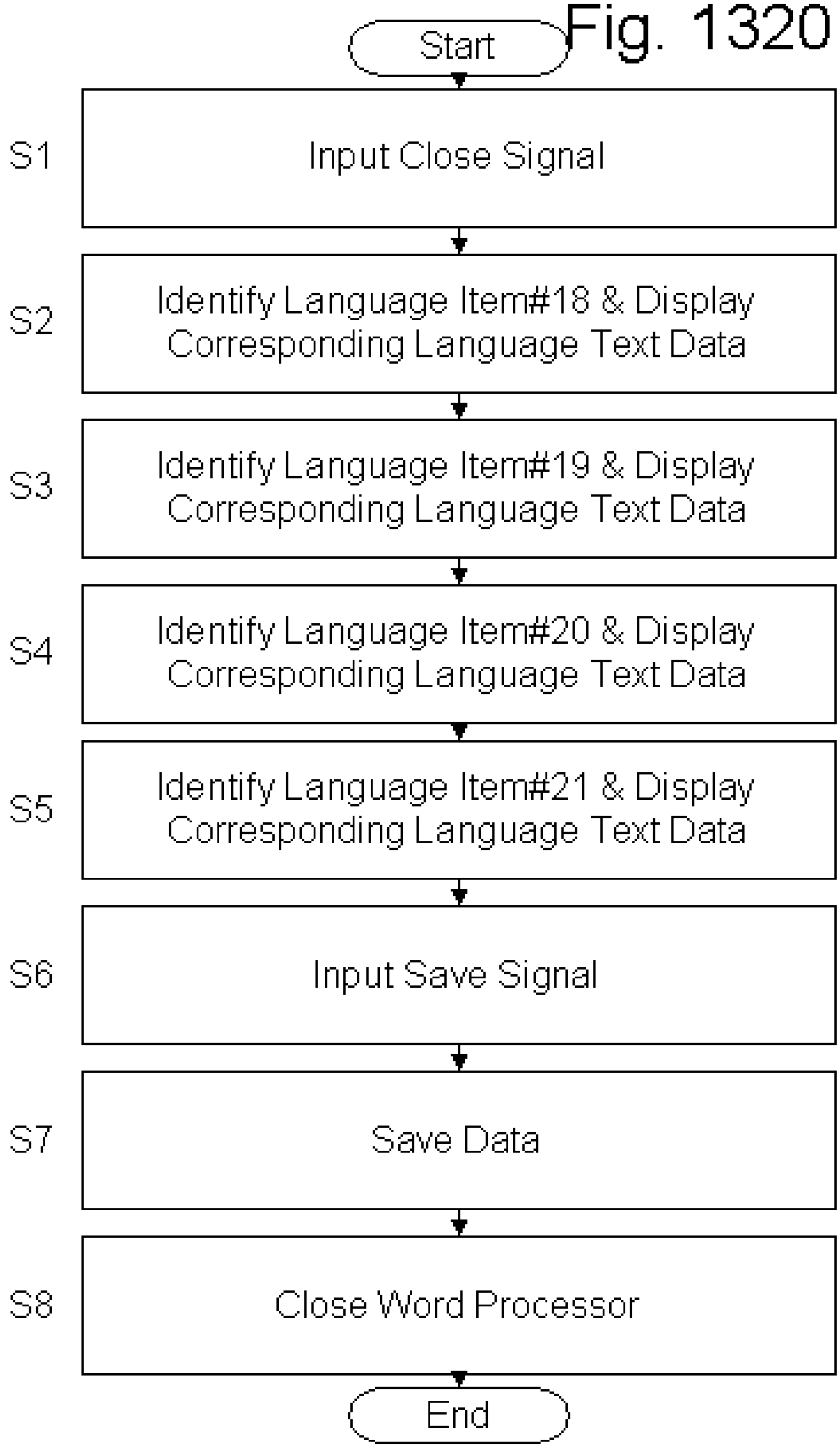

Fig. 1321
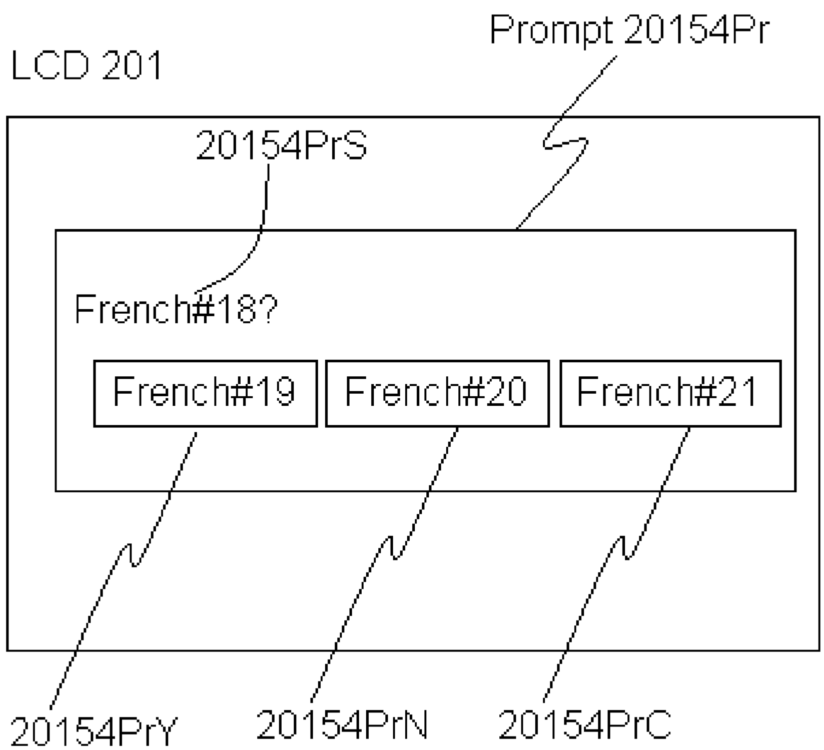

Fig. 1322
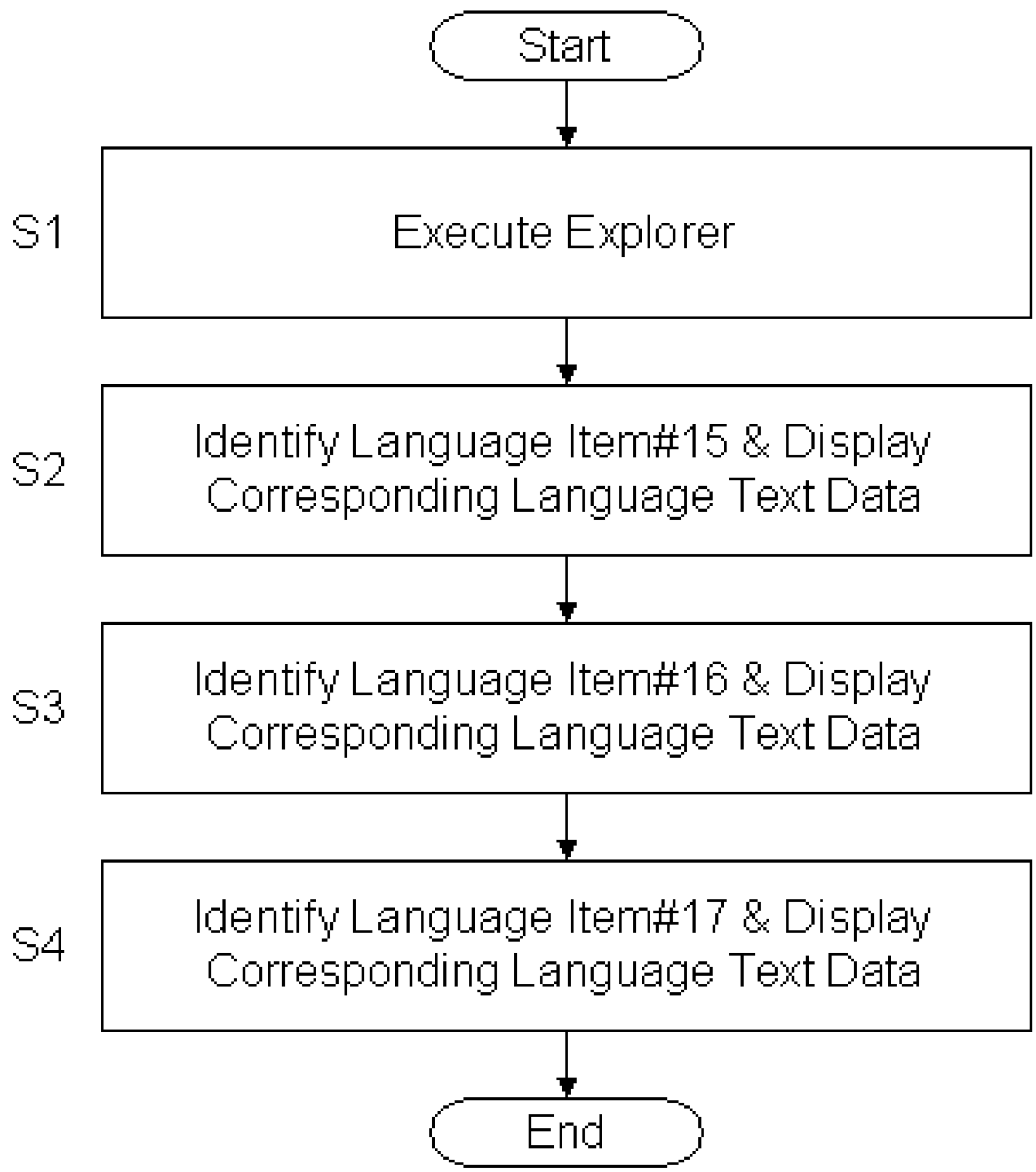

Fig. 1323
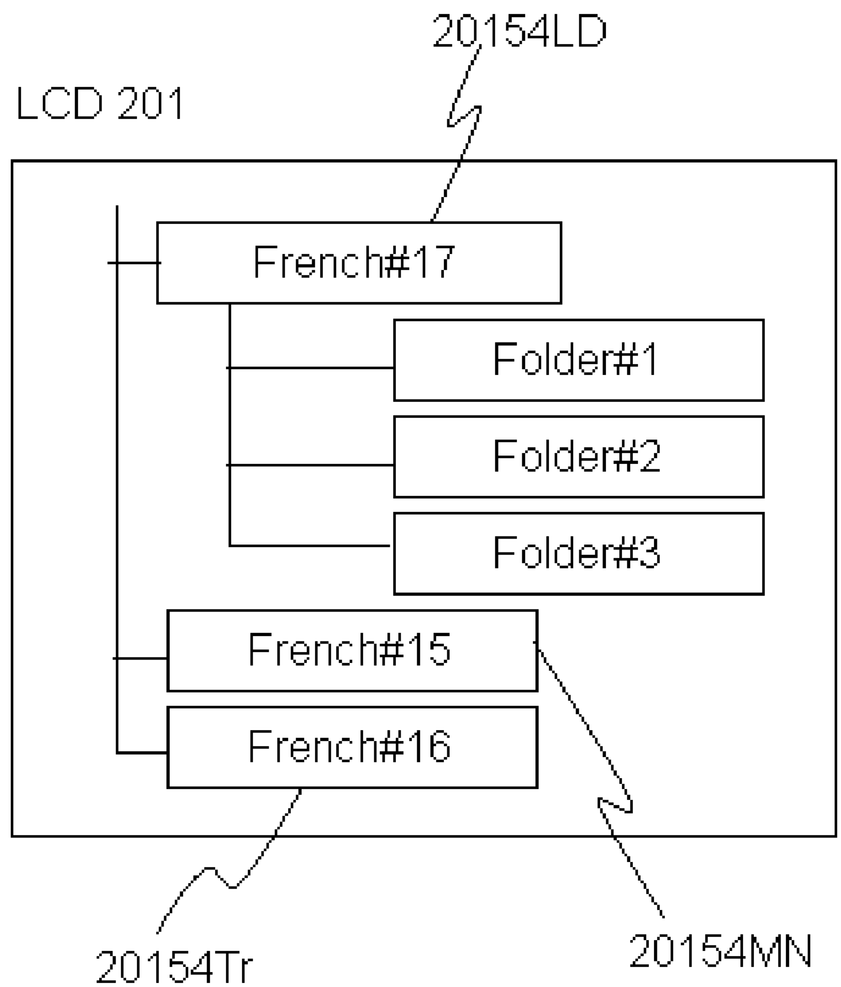

Fig. 1324
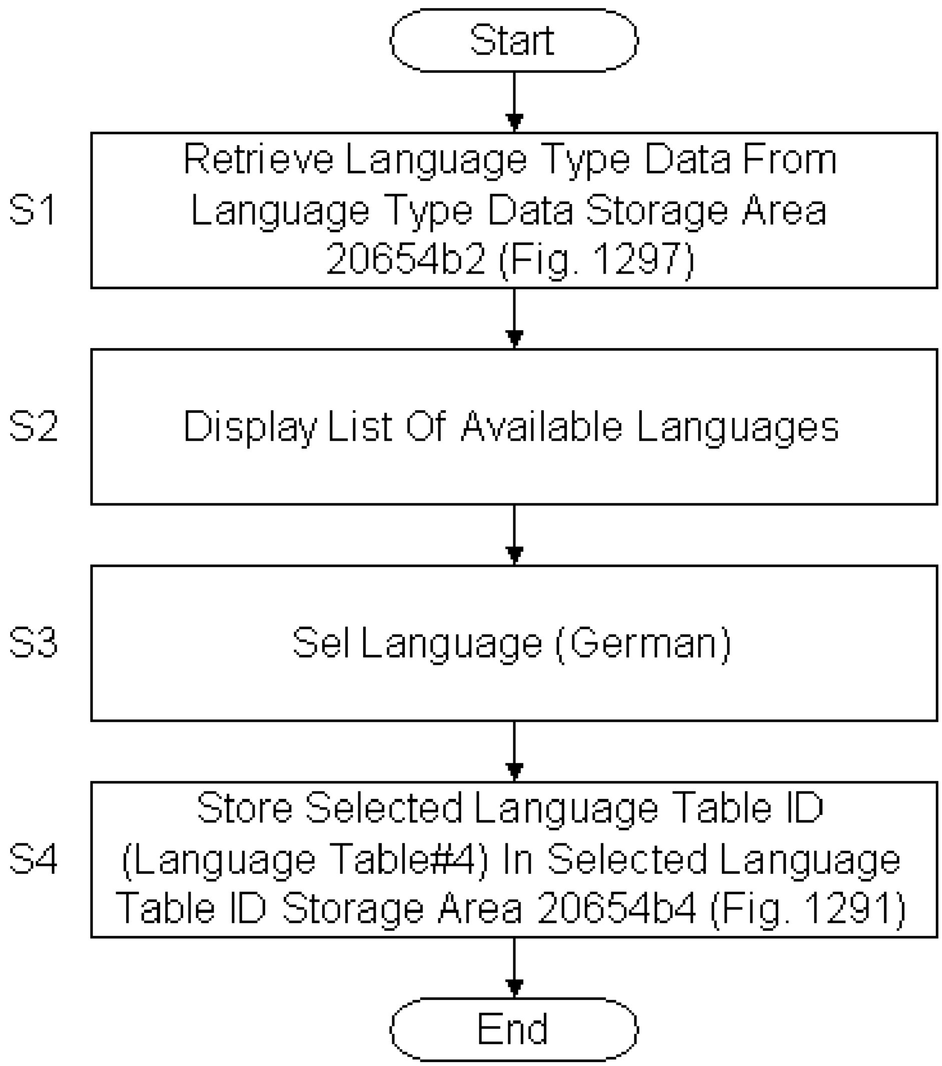

Fig. 1325
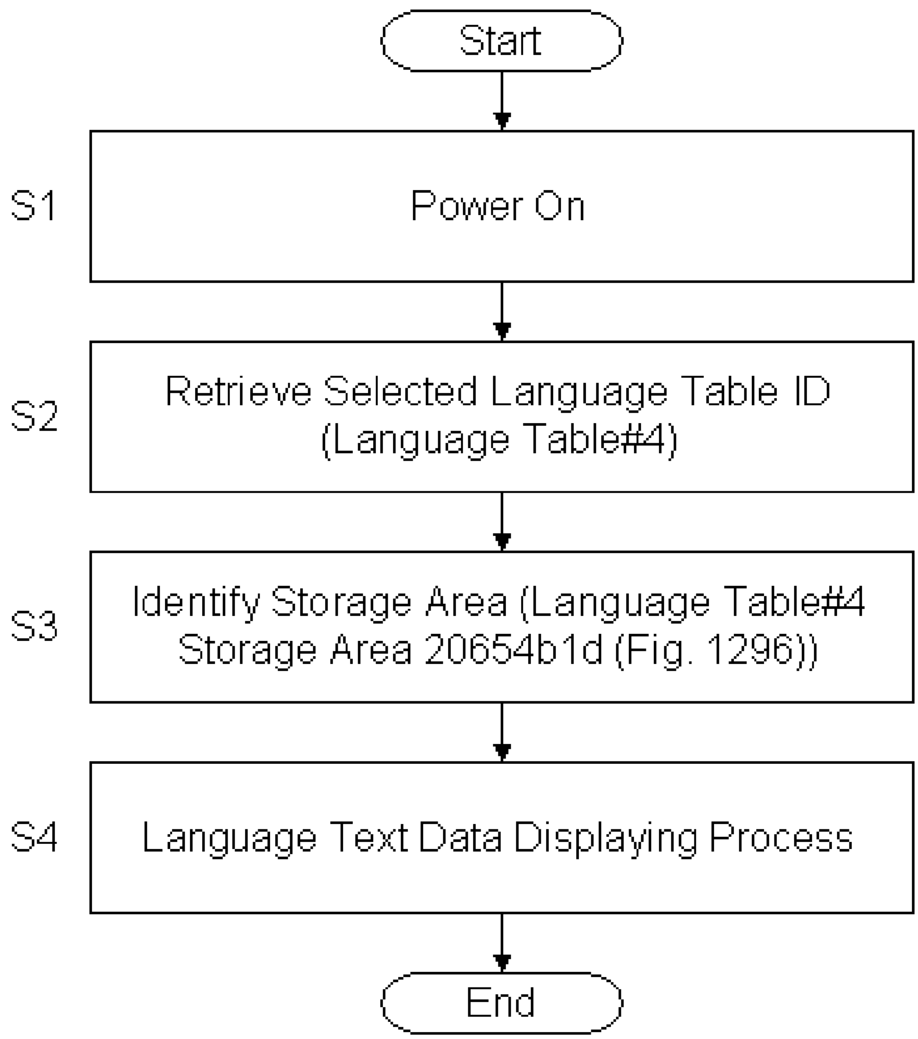

Fig. 1326
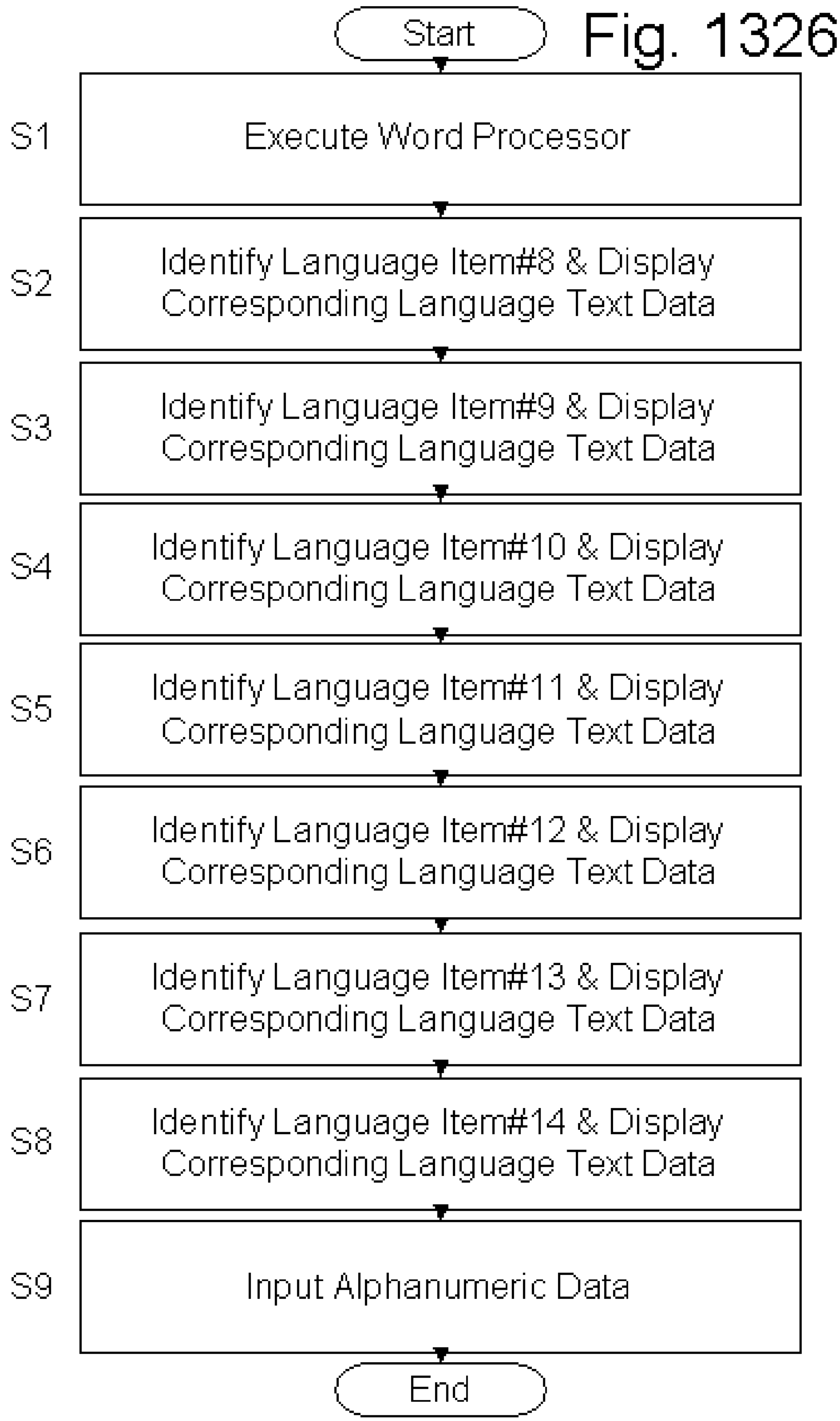

Fig. 1327
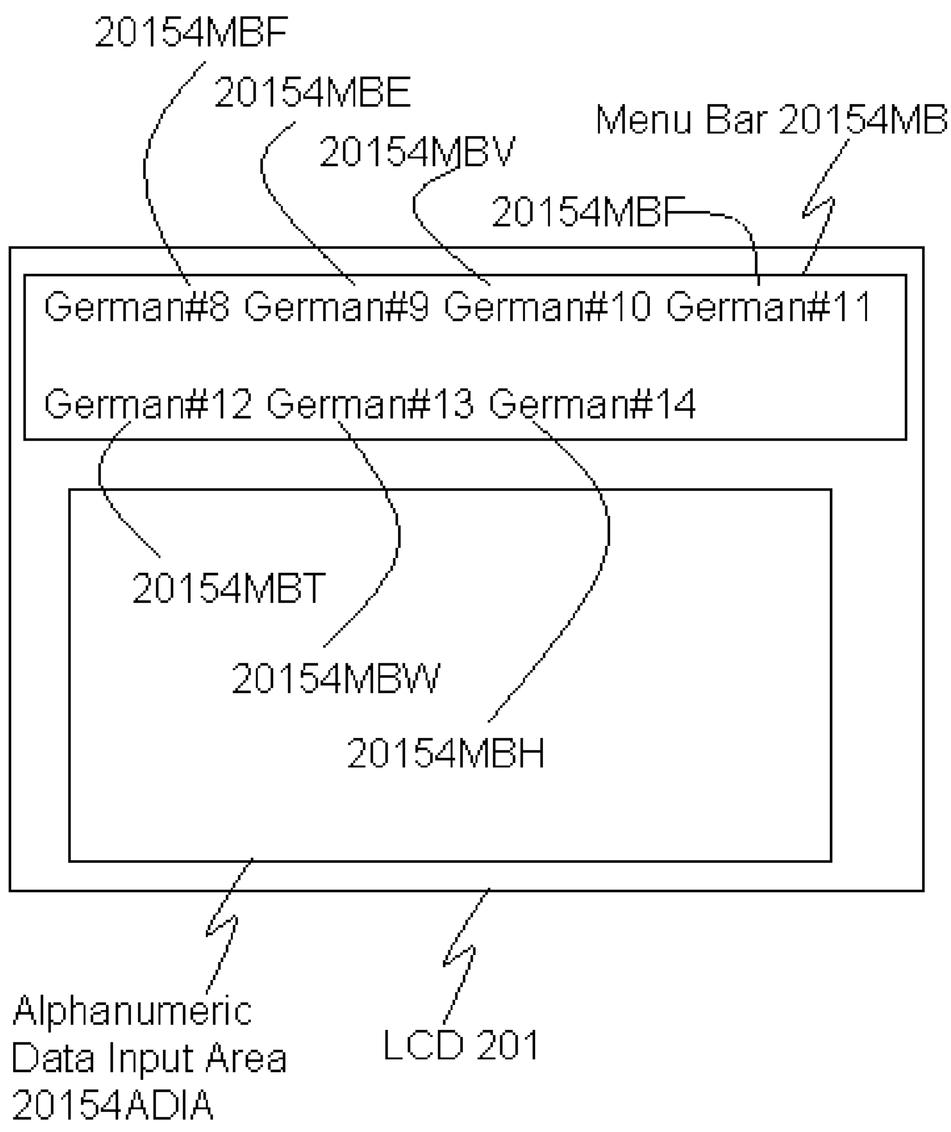

Fig. 1328
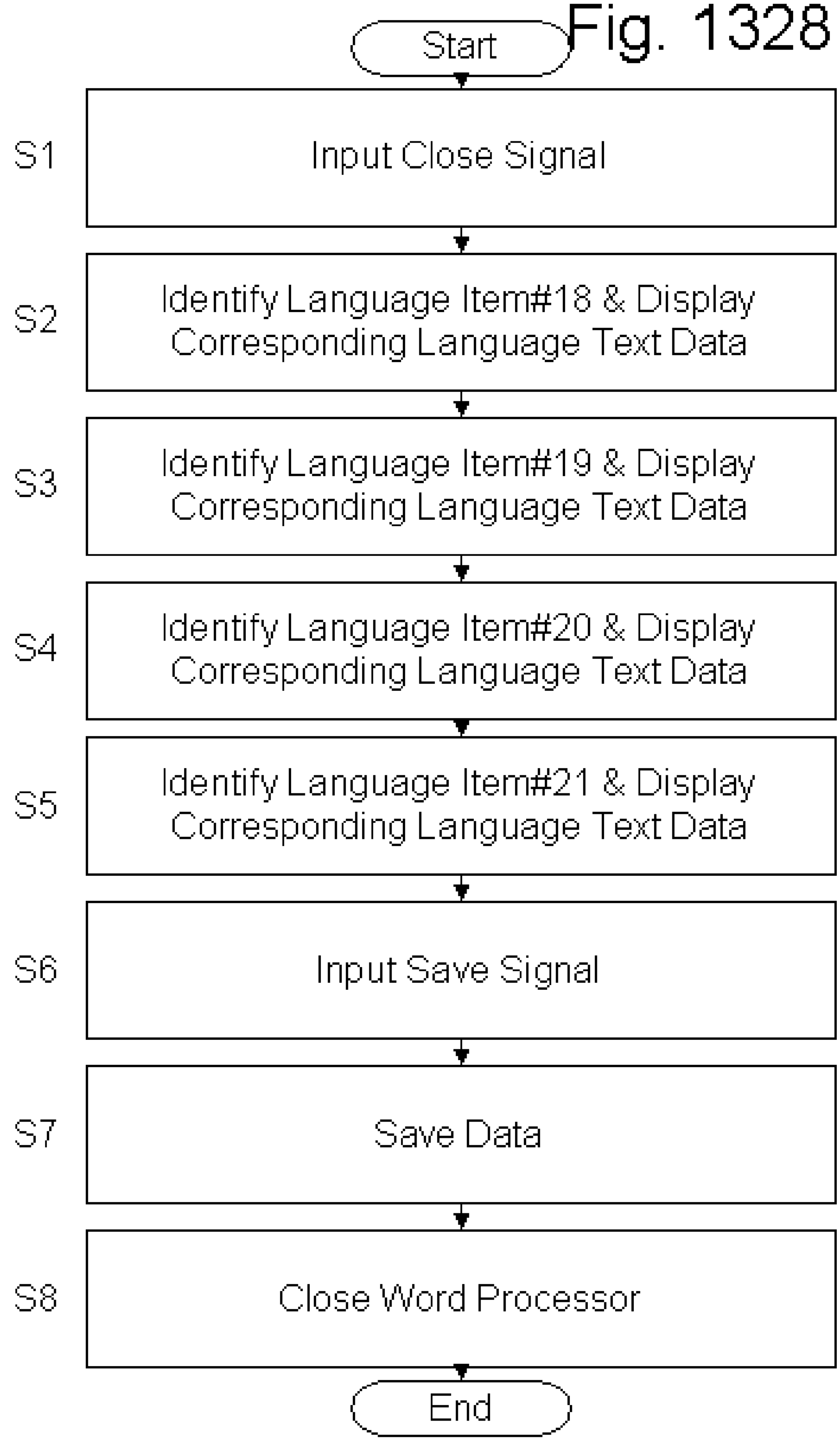

Fig. 1329
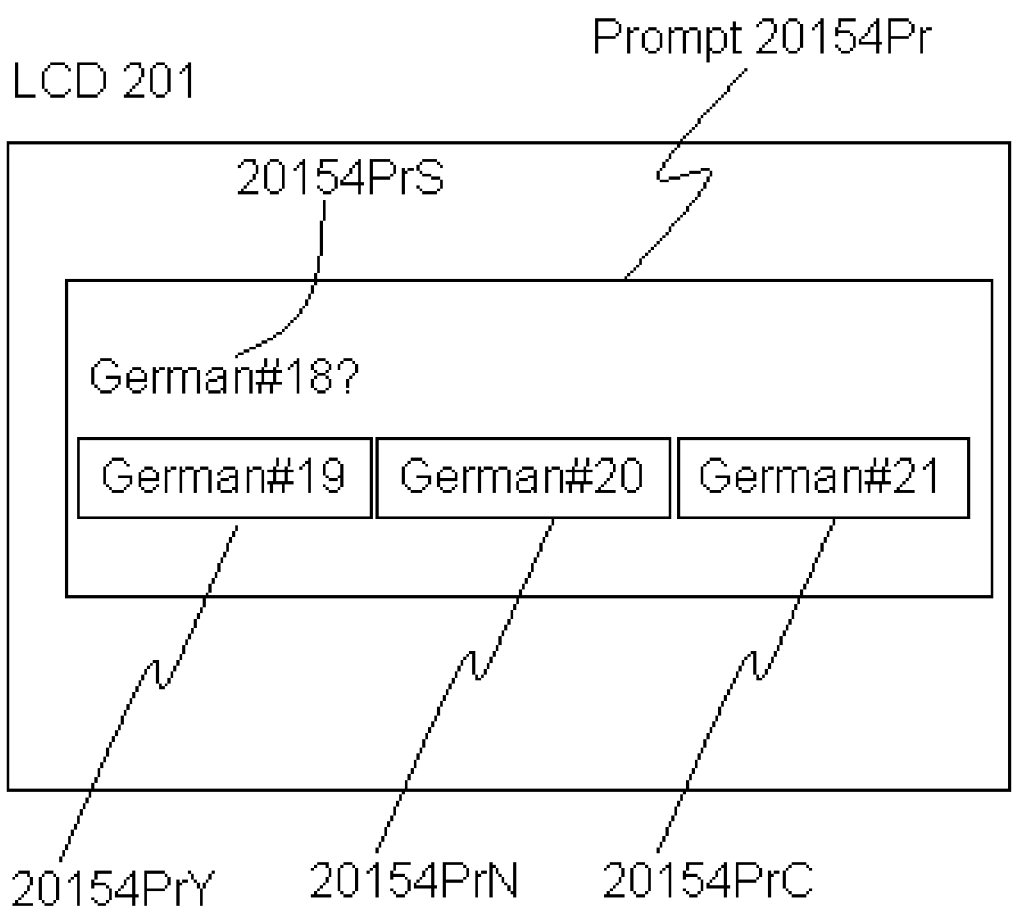

Fig. 1330
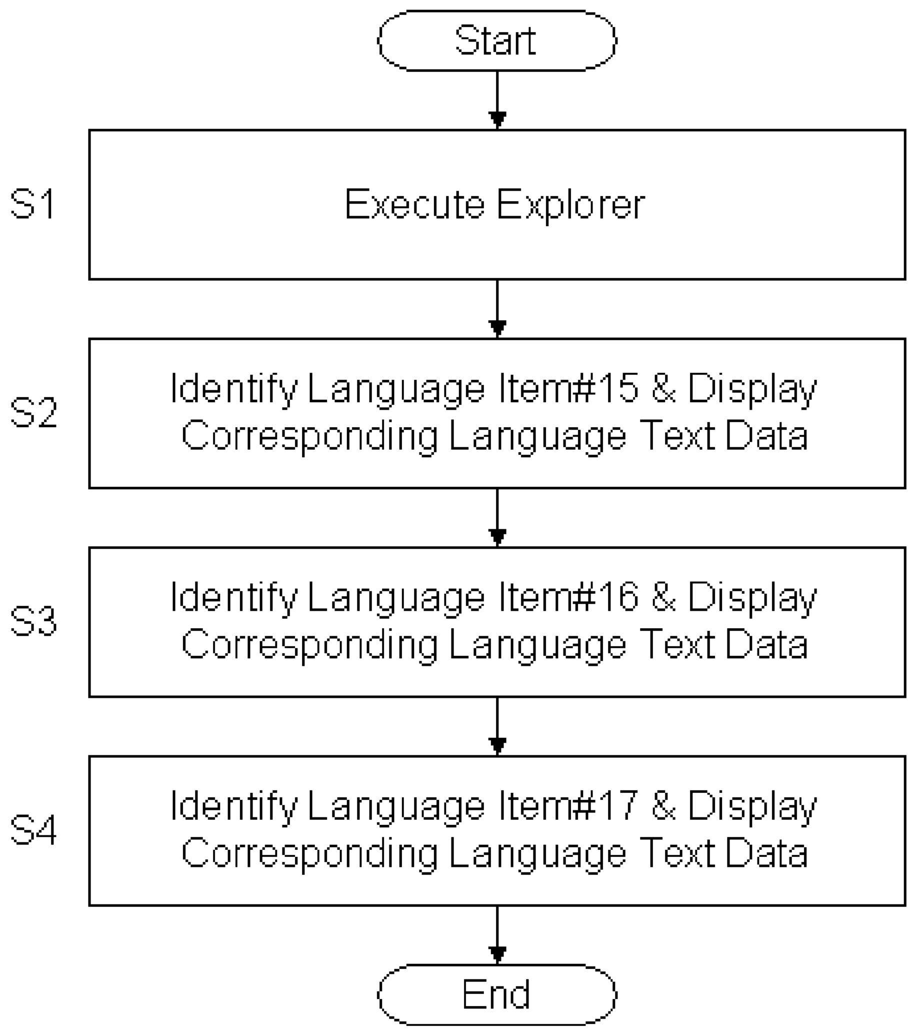

Fig. 1331
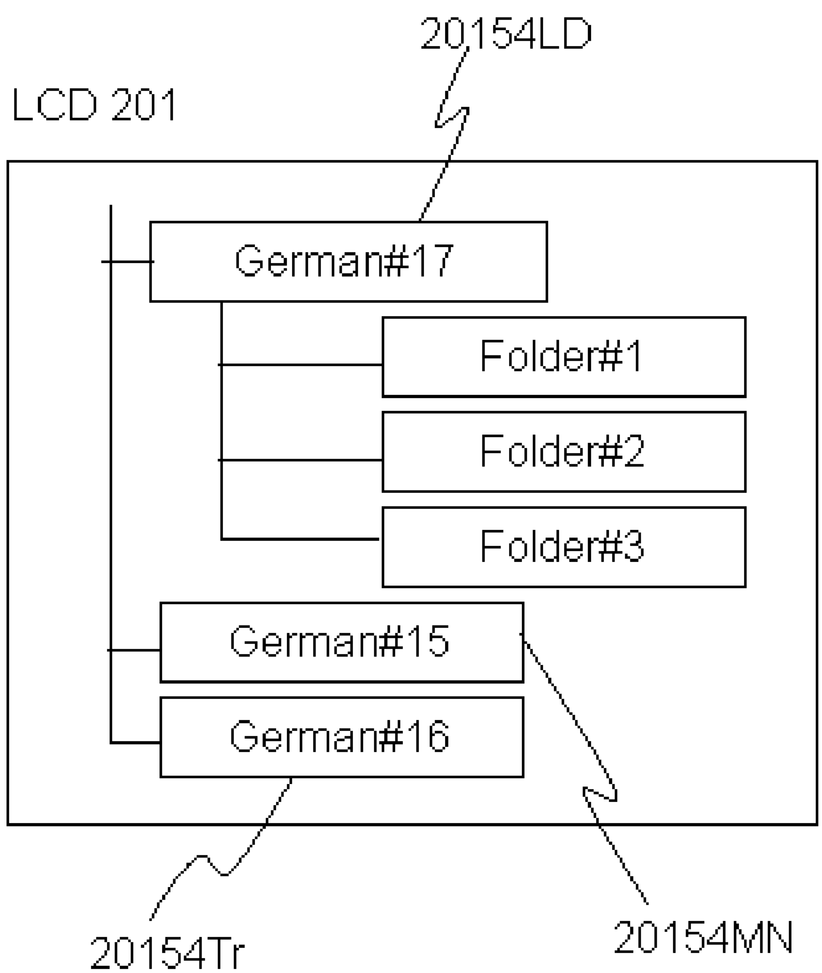

Fig. 1332
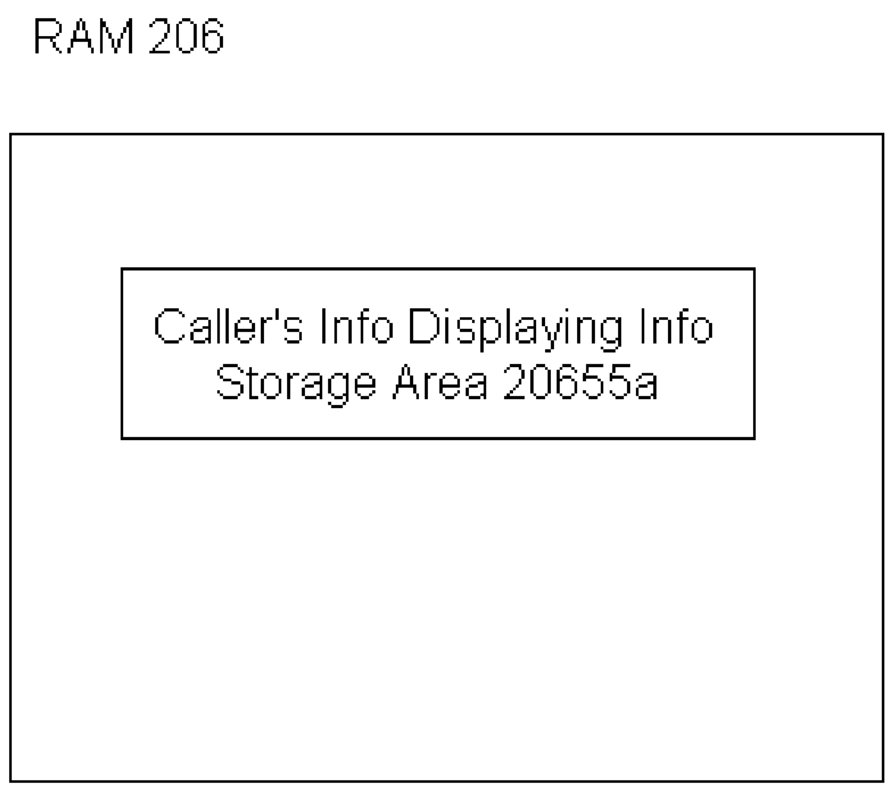

Fig. 1333
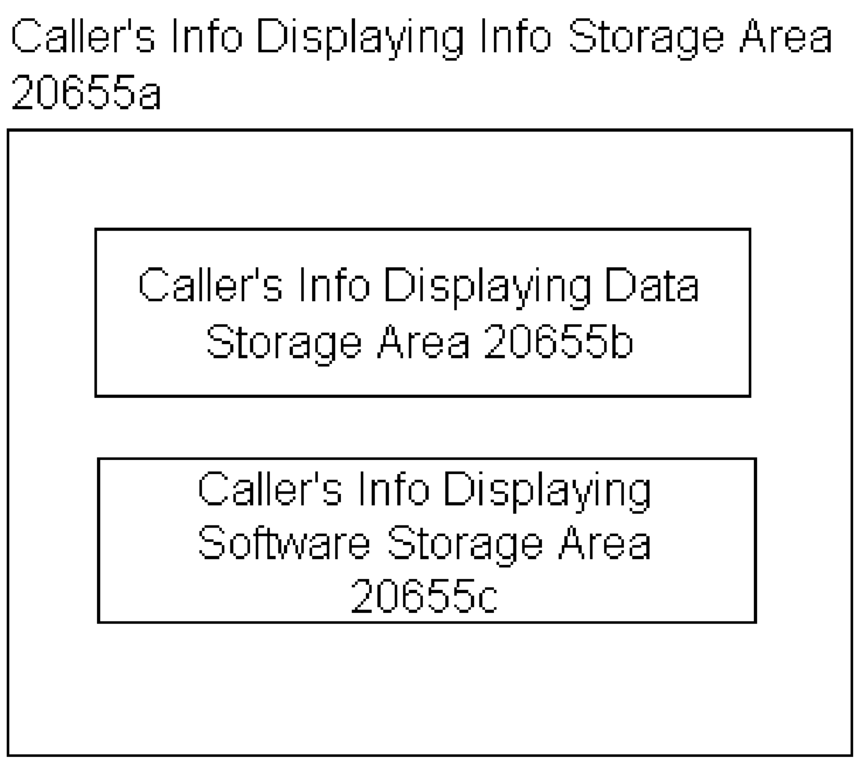

Fig. 1334
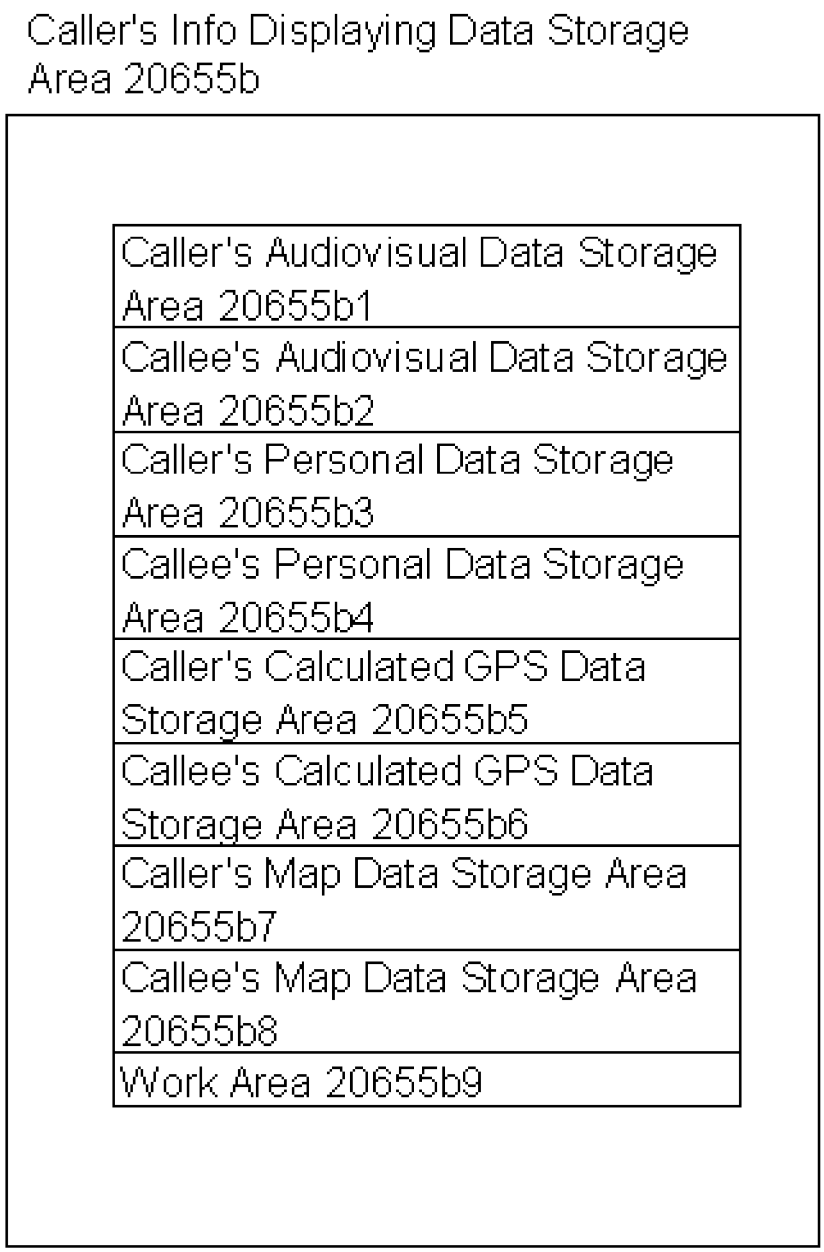

Fig. 1335
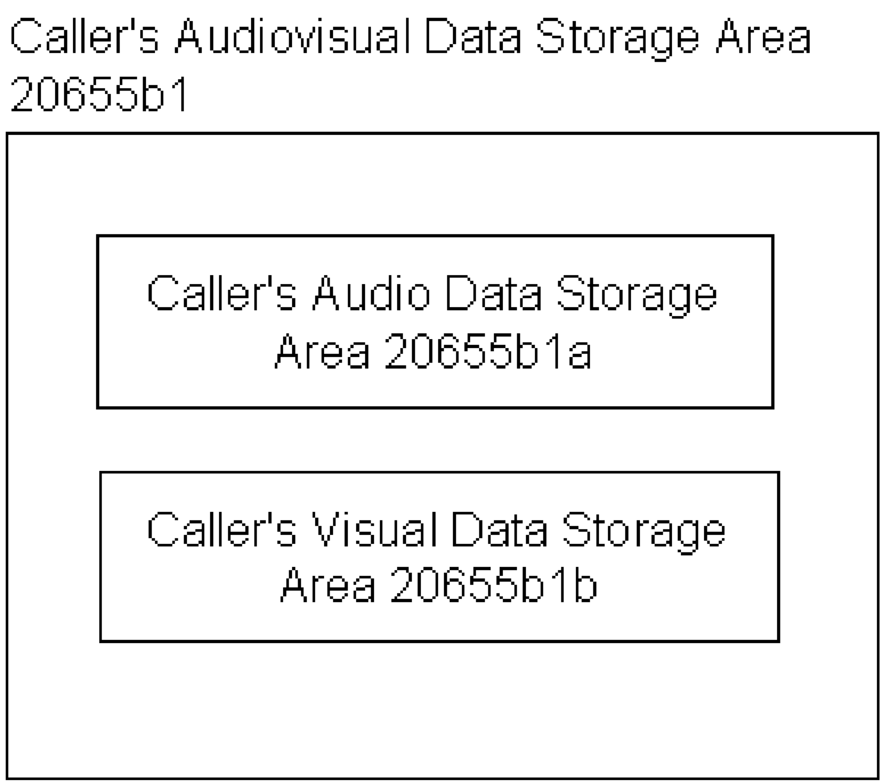

Fig. 1336
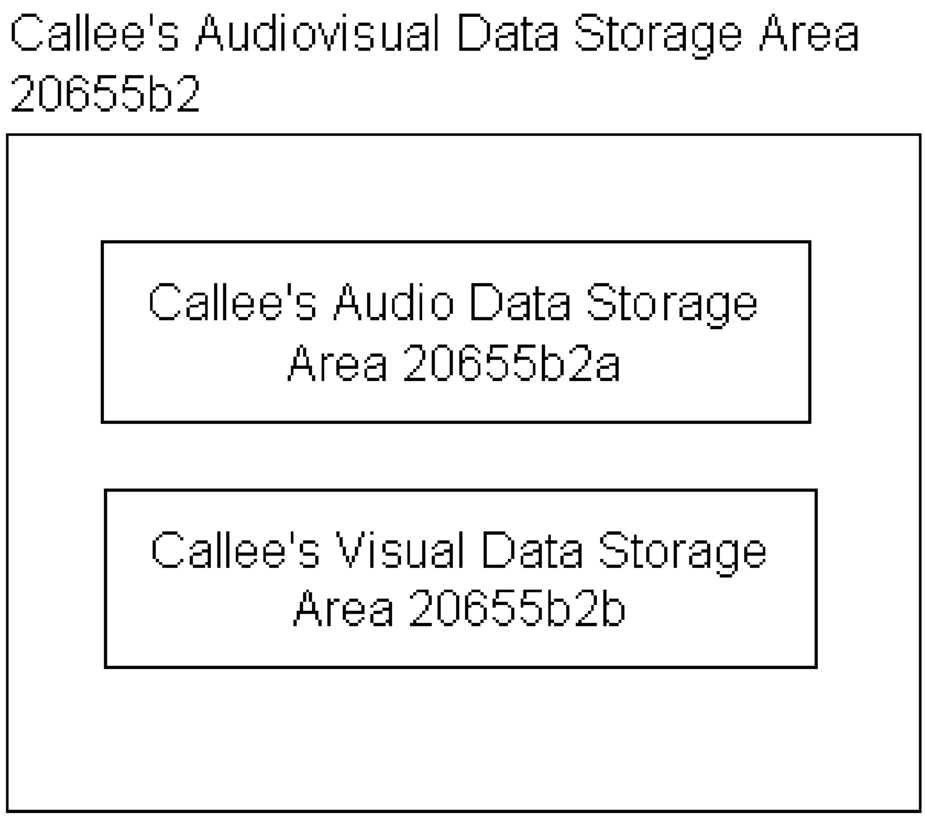

Fig. 1337

Caller's Personal Data Storage Area
20655b3

| Caller's Personal Data | Permitted Caller's Personal Data Flag |
|---|---|
| Caller's Name | 1 |
| Caller's Phone Number | 1 |
| Caller's Email Address | 1 |
| Caller's Home Address | 1 |
| Caller's Business Address | 0 |
| Caller's Title | 0 |
| Caller's Hobby | 0 |
| Caller's Blood Type | 0 |
| Caller's Gender | 0 |
| Caller's Age | 0 |
| Caller's Date Of Birth | 0 |

Fig. 1338
Callee's Personal Data Storage Area
20655b4
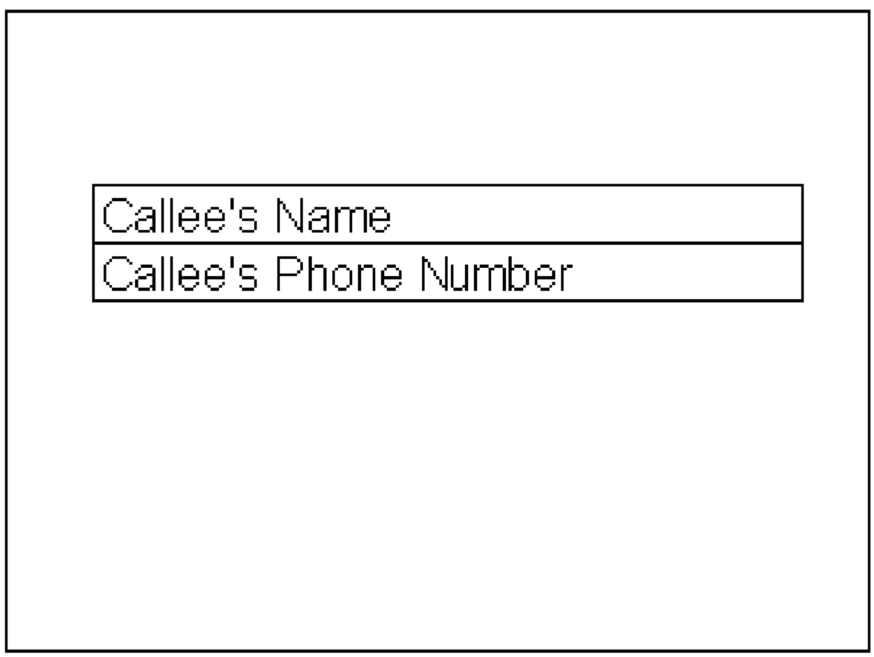

Fig. 1339

Caller's Info Displaying Software Storage Area 20655c

| |
|---|
| Permitted Caller's Personal Data Selecting Software 20655c1 |
| Dialing Software 20655c2 |
| Caller's Device Pin-pointing Software 20655c3 |
| Map Data Sending/Receiving Software 20655c4 |
| Caller's Audiovisual Data Collecting Software 20655c5 |
| Caller's Info Sending/Receiving Software 20655c6 |
| Callee's Info Sending/Receiving Software 20655c6a |
| Permitted Callee's Personal Data Displaying Software 20655c7 |
| Map Displaying Software 20655c8 |
| Callee's Audio Data Outputting Software 20655c9 |
| Callee's Visual Data Displaying Software 20655c10 |

Fig. 1340
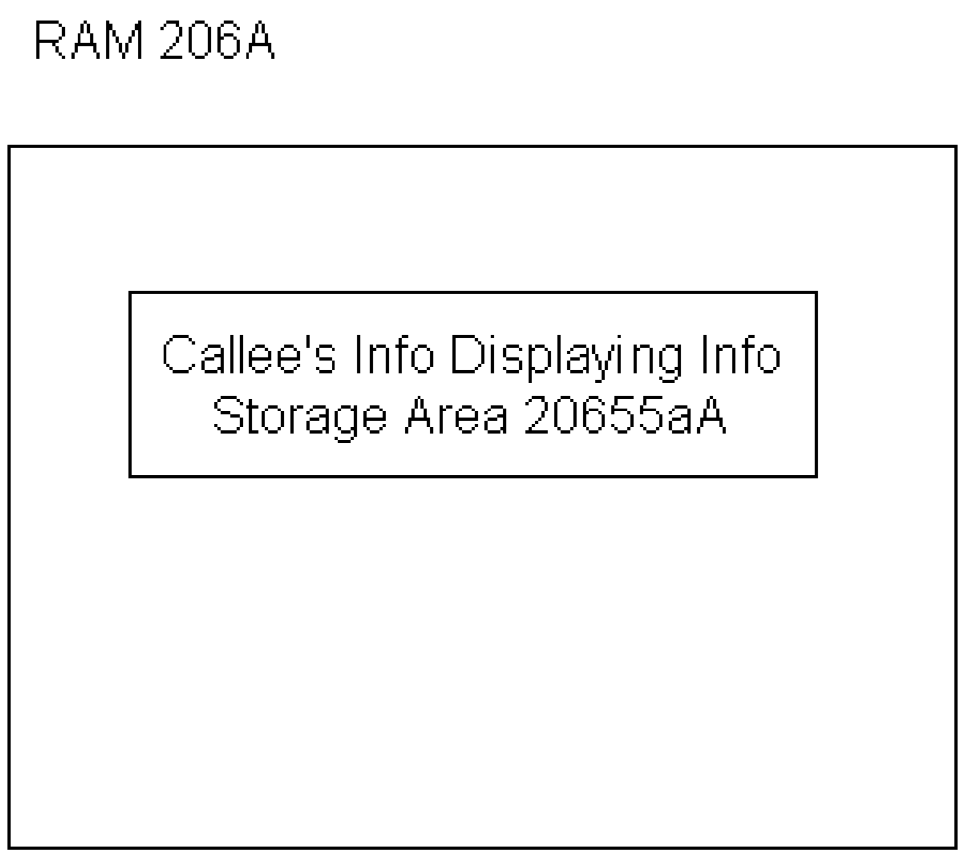

Fig. 1341
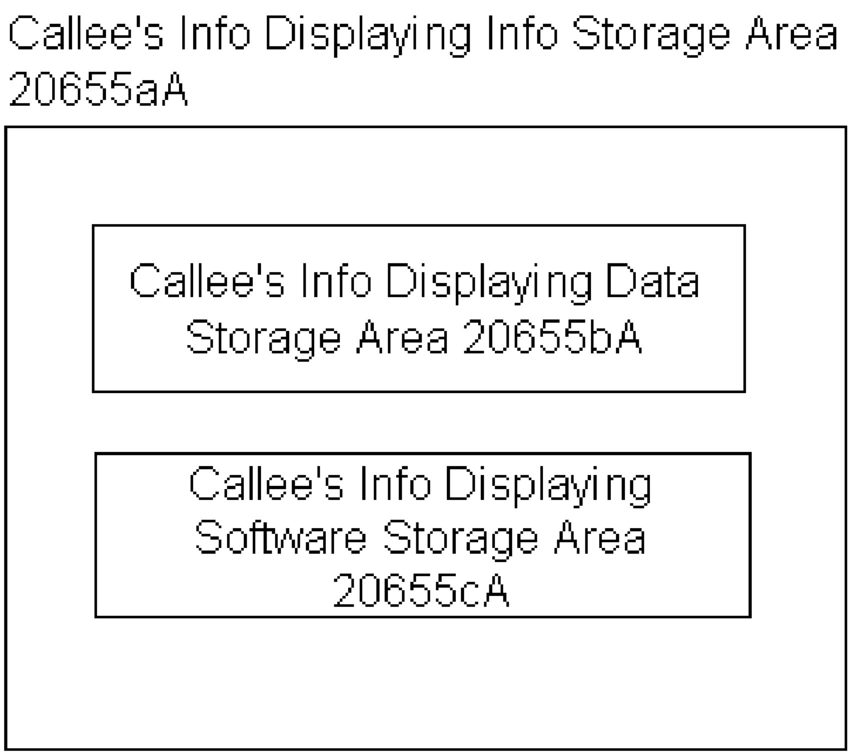

Fig. 1342
Callee's Info Displaying Data Storage Area 20655bA
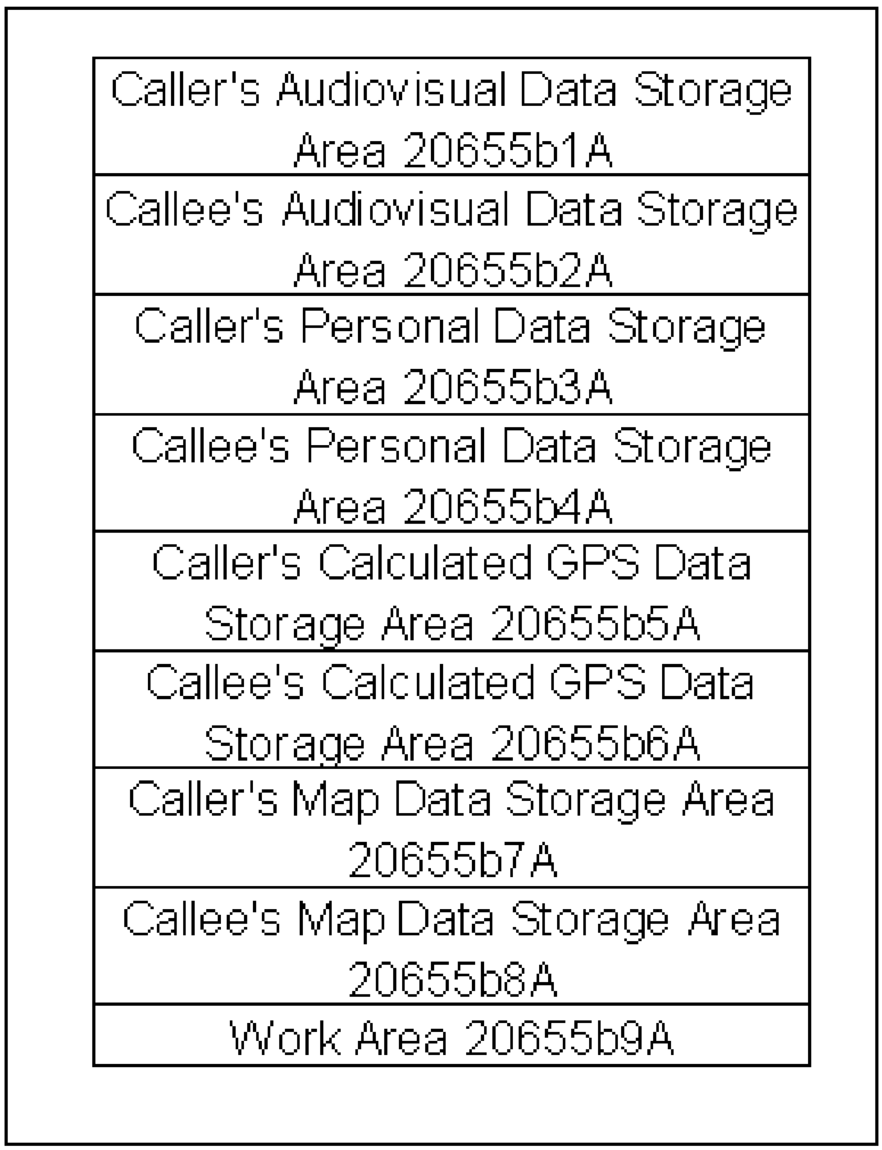

Fig. 1343
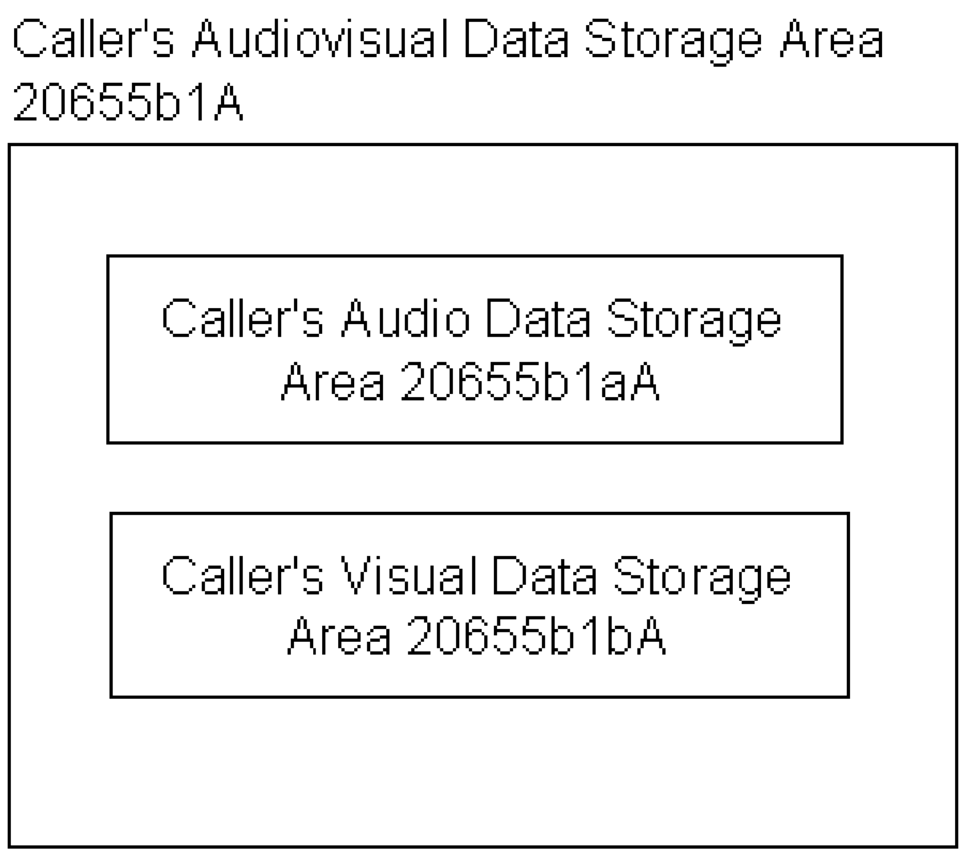

Fig. 1344
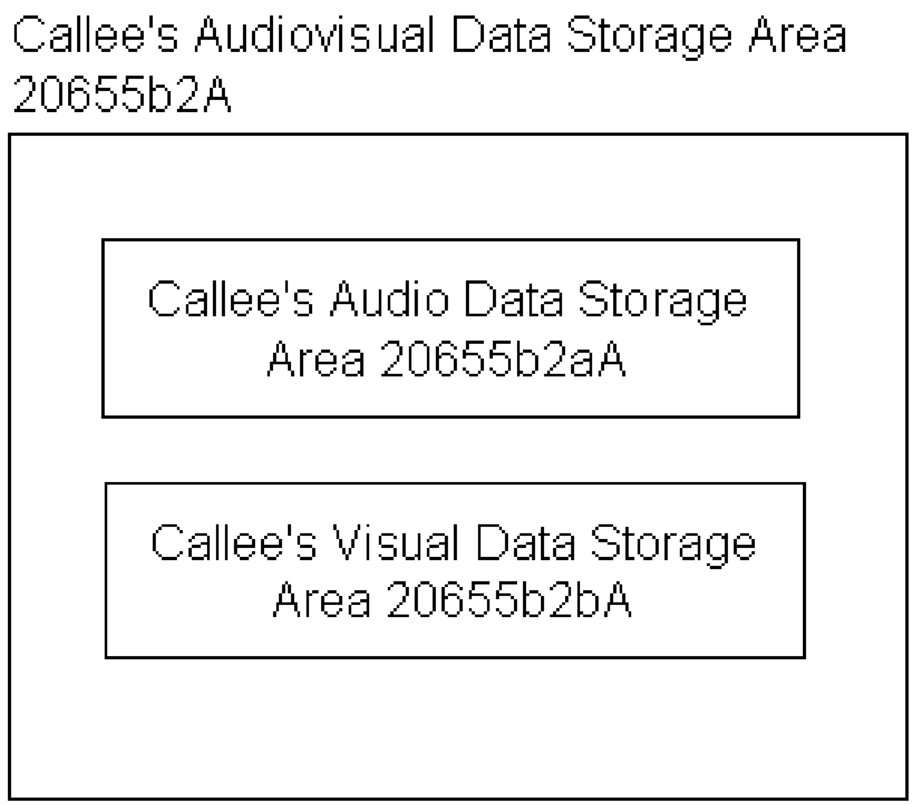

Fig. 1345
Caller's Personal Data Storage Area
20655b3A
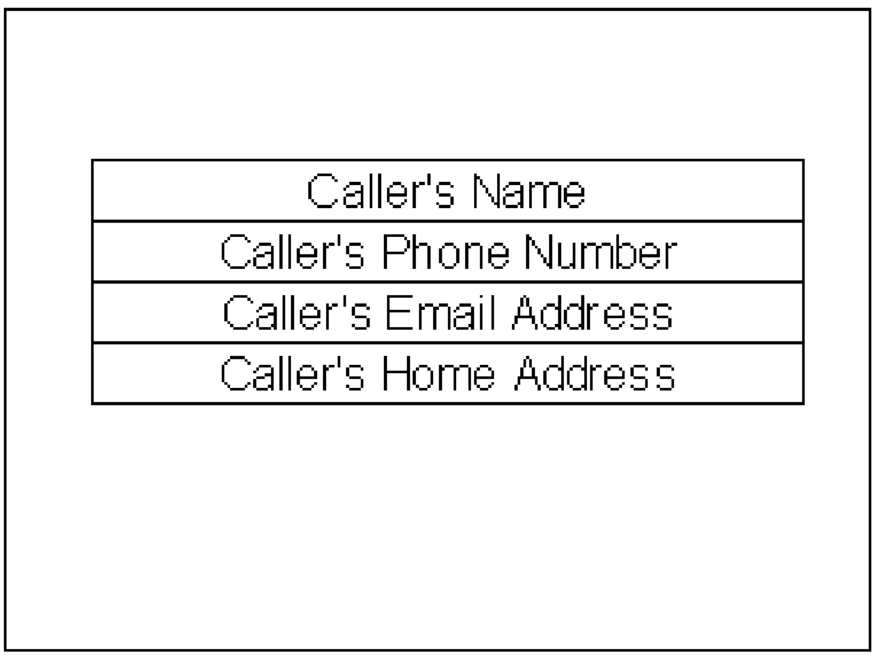

Fig. 1346

Callee's Personal Data Storage Area
20655b4A

| Callee's Personal Data | Permitted Callee's Personal Data Flag |
|---|---|
| Callee's Name | 1 |
| Callee's Phone Number | 1 |
| Callee's Email Address | 0 |
| Callee's Home Address | 0 |
| Callee's Business Address | 0 |
| Callee's Title | 0 |
| Callee's Hobby | 0 |
| Callee's Blood Type | 0 |
| Callee's Gender | 0 |
| Callee's Age | 0 |
| Callee's Date Of Birth | 0 |

Fig. 1347

Callee's Info Displaying Software Storage Area 20655cA

| |
|---|
| Permitted Callee's Personal Data Selecting Software 20655c1A |
| Dialing Software 20655c2A |
| Callee's Device Pin-pointing Software 20655c3A |
| Map Data Sending/Receiving Software 20655c4A |
| Callee's Audiovisual Data Collecting Software 20655c5A |
| Callee's Info Sending/Receiving Software 20655c6A |
| Caller's Info Sending/Receiving Software 20655c6aA |
| Permitted Caller's Personal Data Displaying Software 20655c7A |
| Map Displaying Software 20655c8A |
| Caller's Audio Data Outputting Software 20655c9A |
| Caller's Visual Data Displaying Software 20655c10A |

Fig. 1348
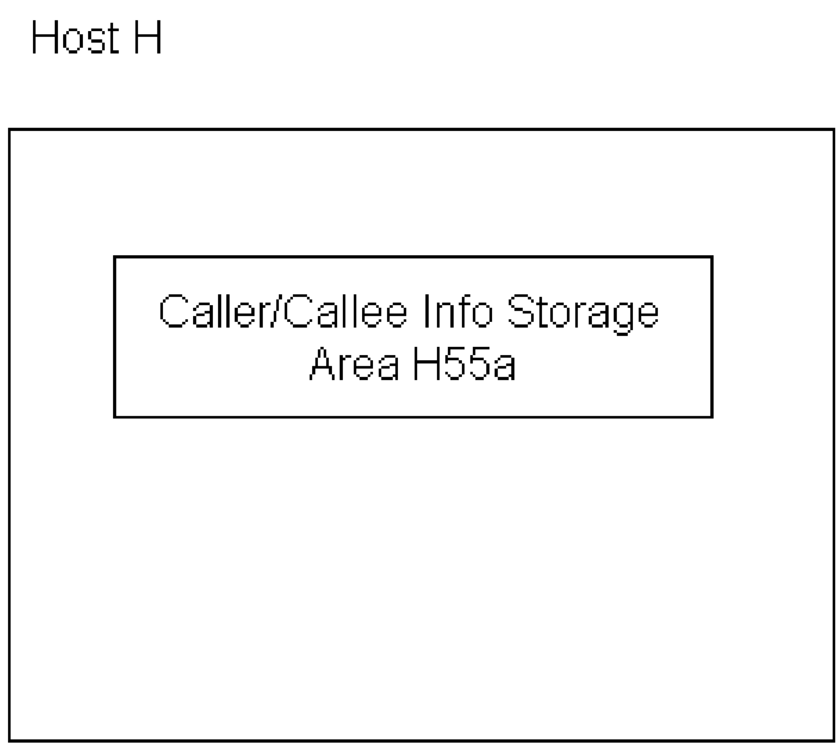

Fig. 1349
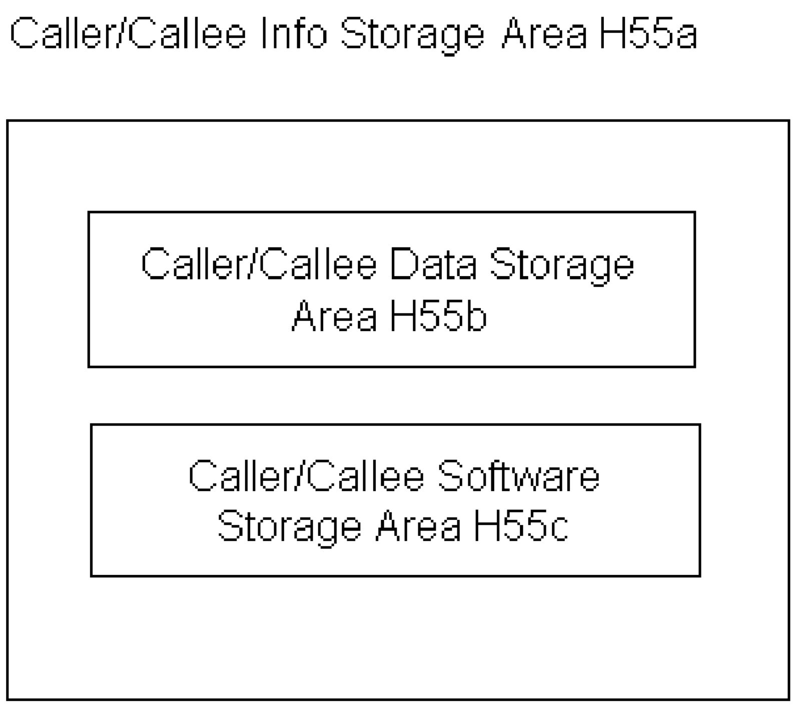

Fig. 1350
Caller/Callee Data Storage Area H55b
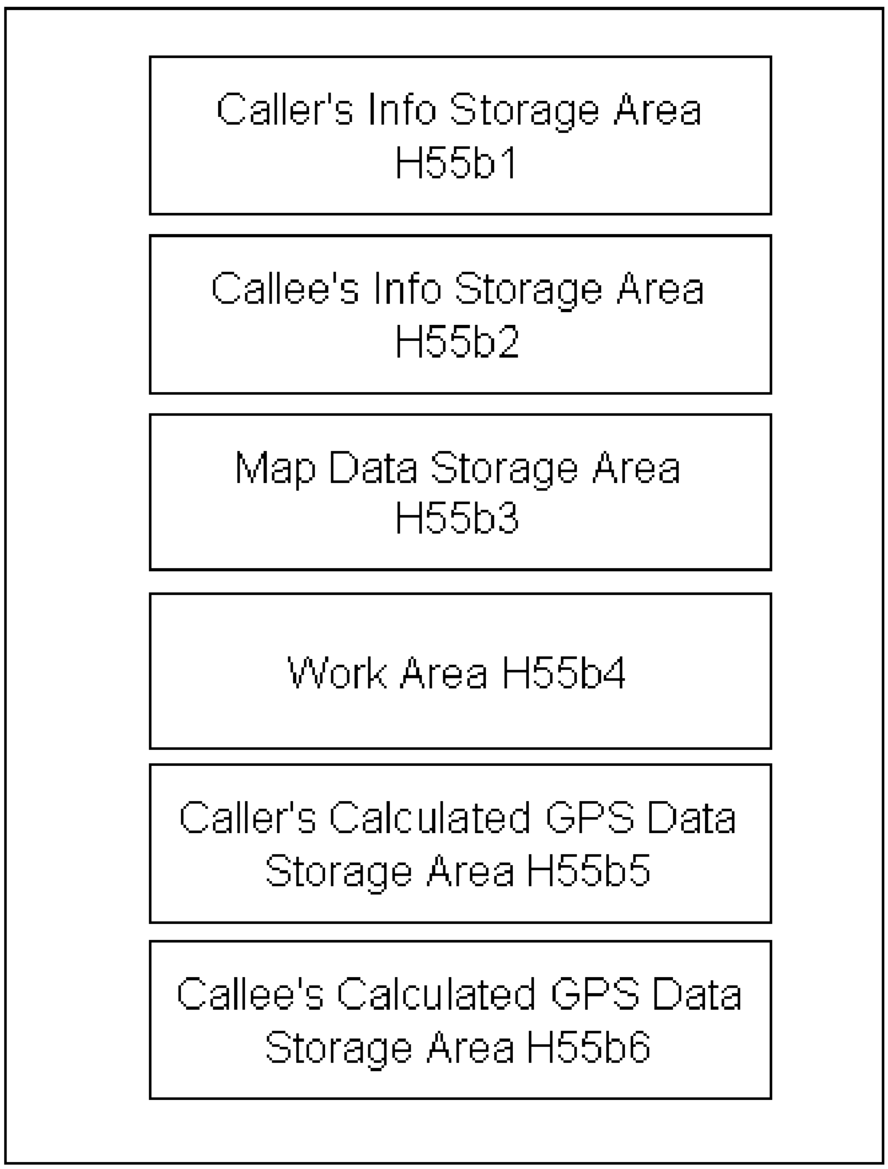

Fig. 1351
Caller/Callee Software Storage Area H55c
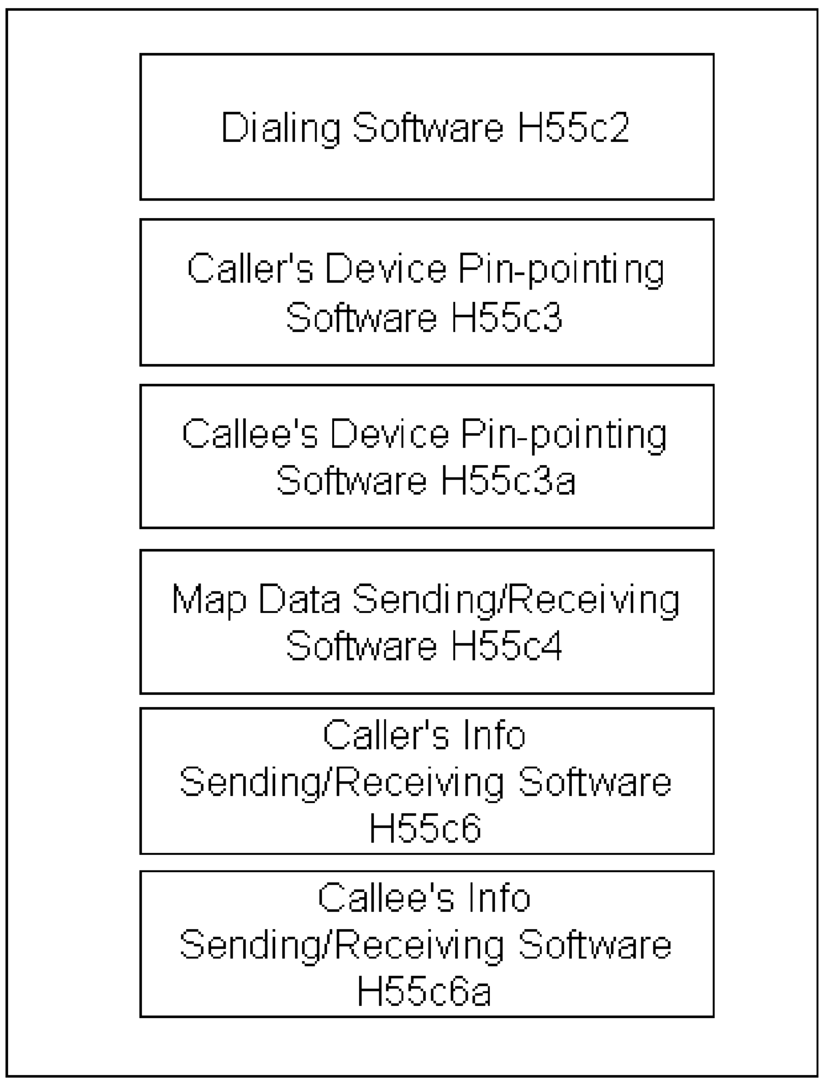

Fig. 1352
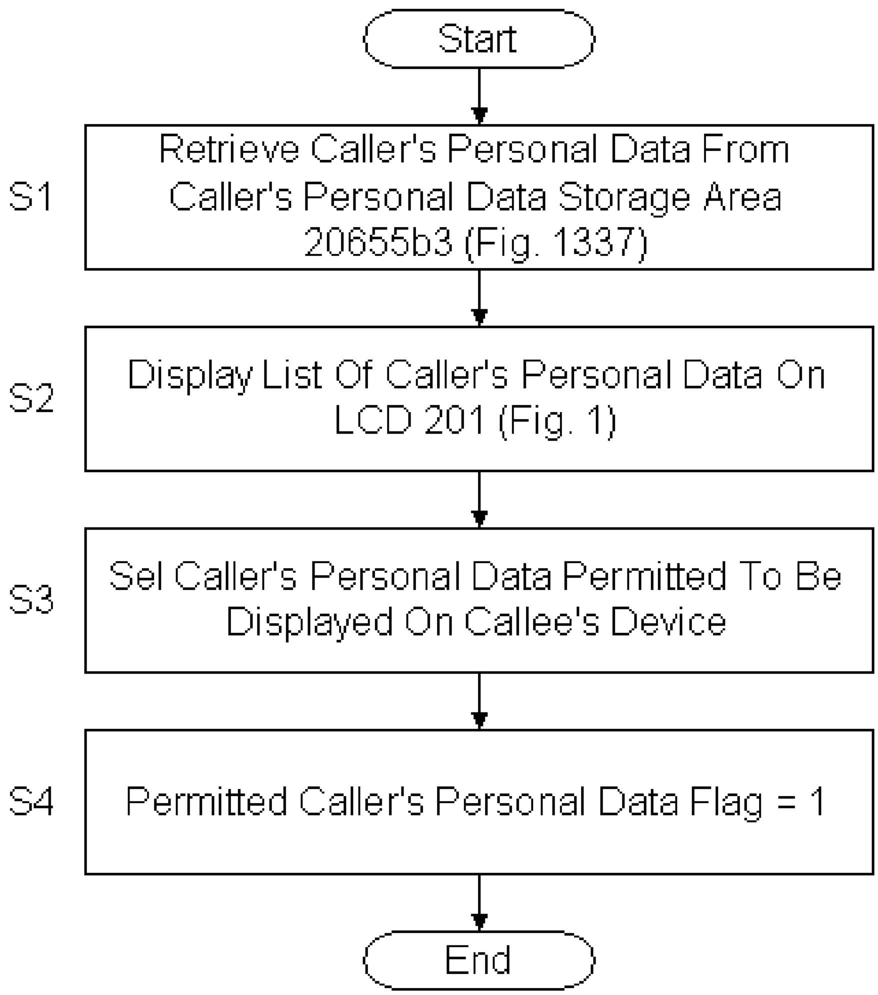

Fig. 1353
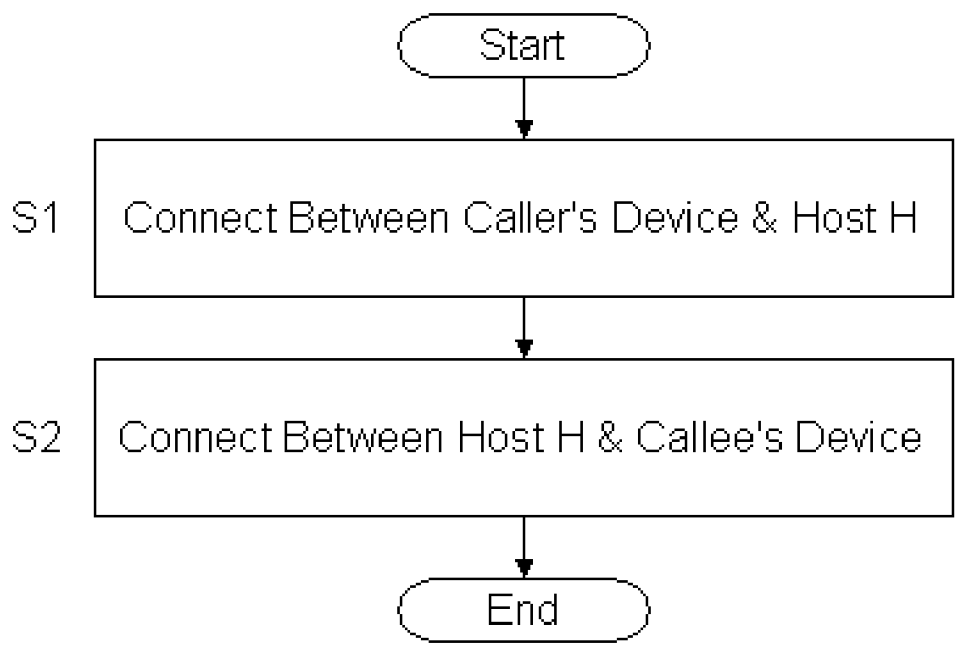

Fig. 1354
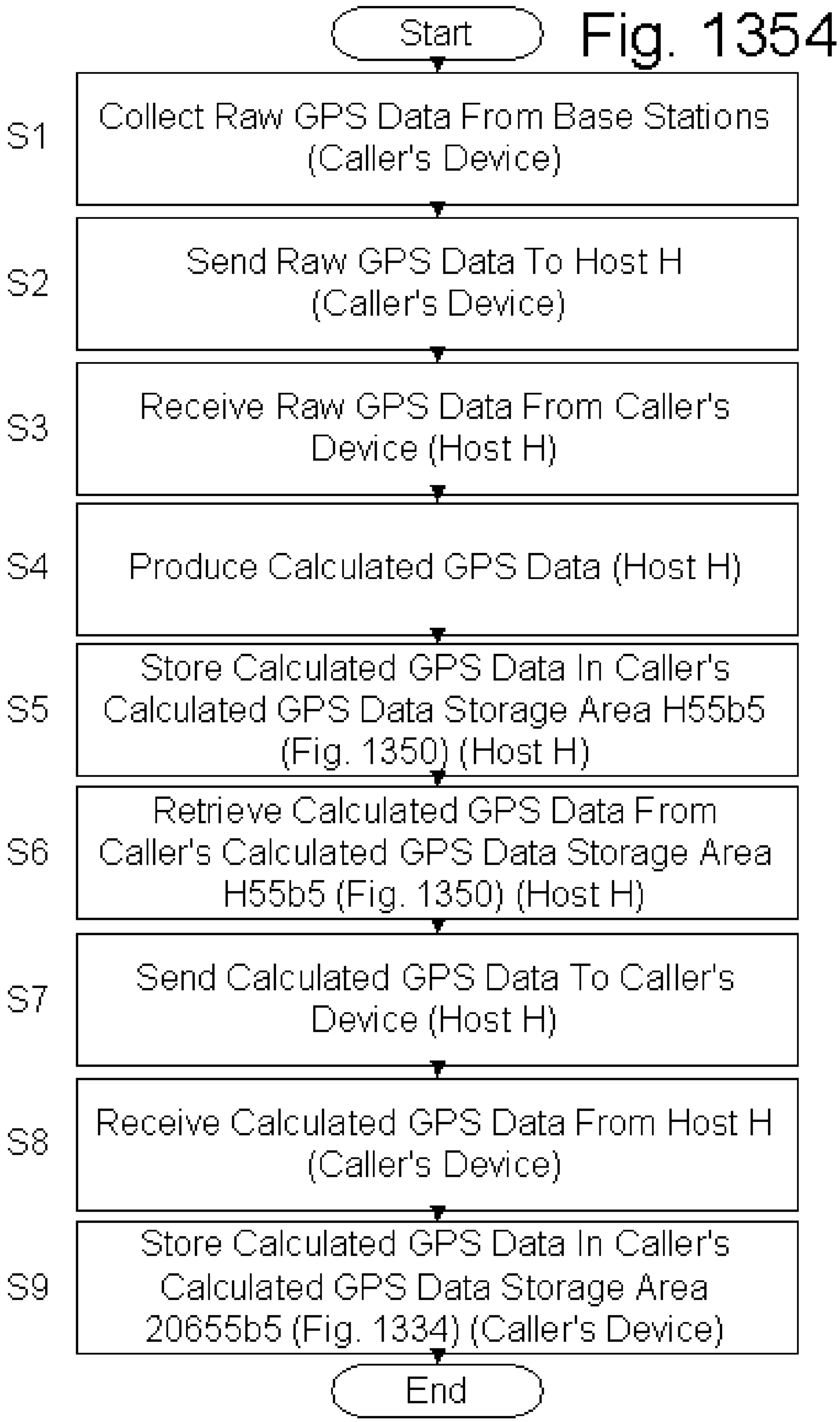

Fig. 1355
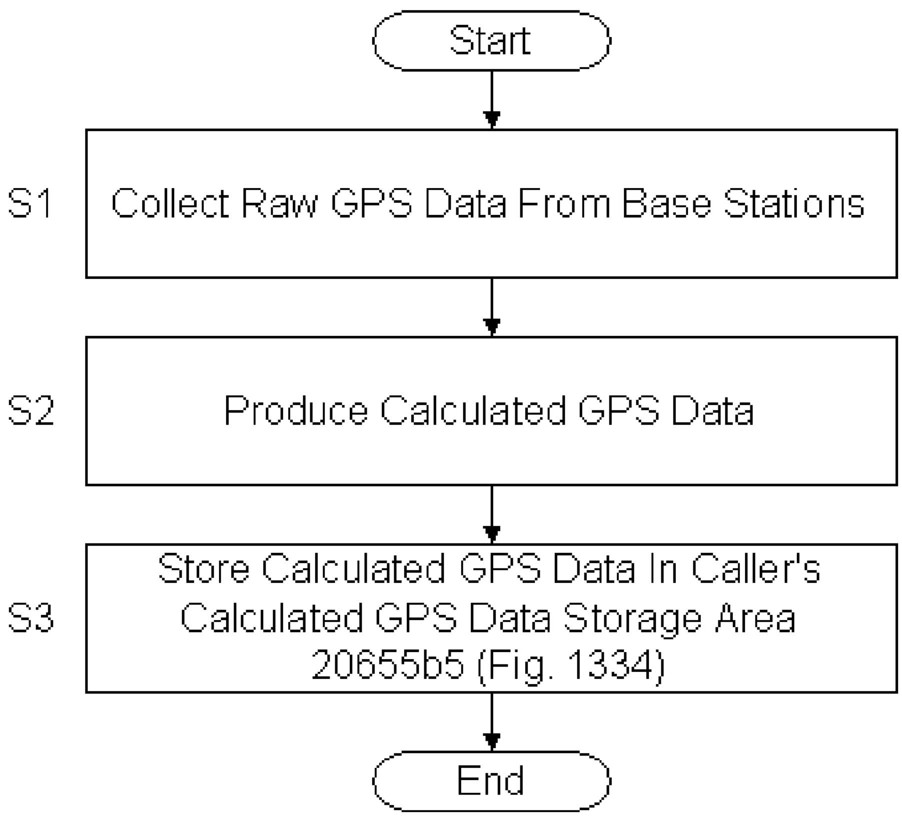

Fig. 1356
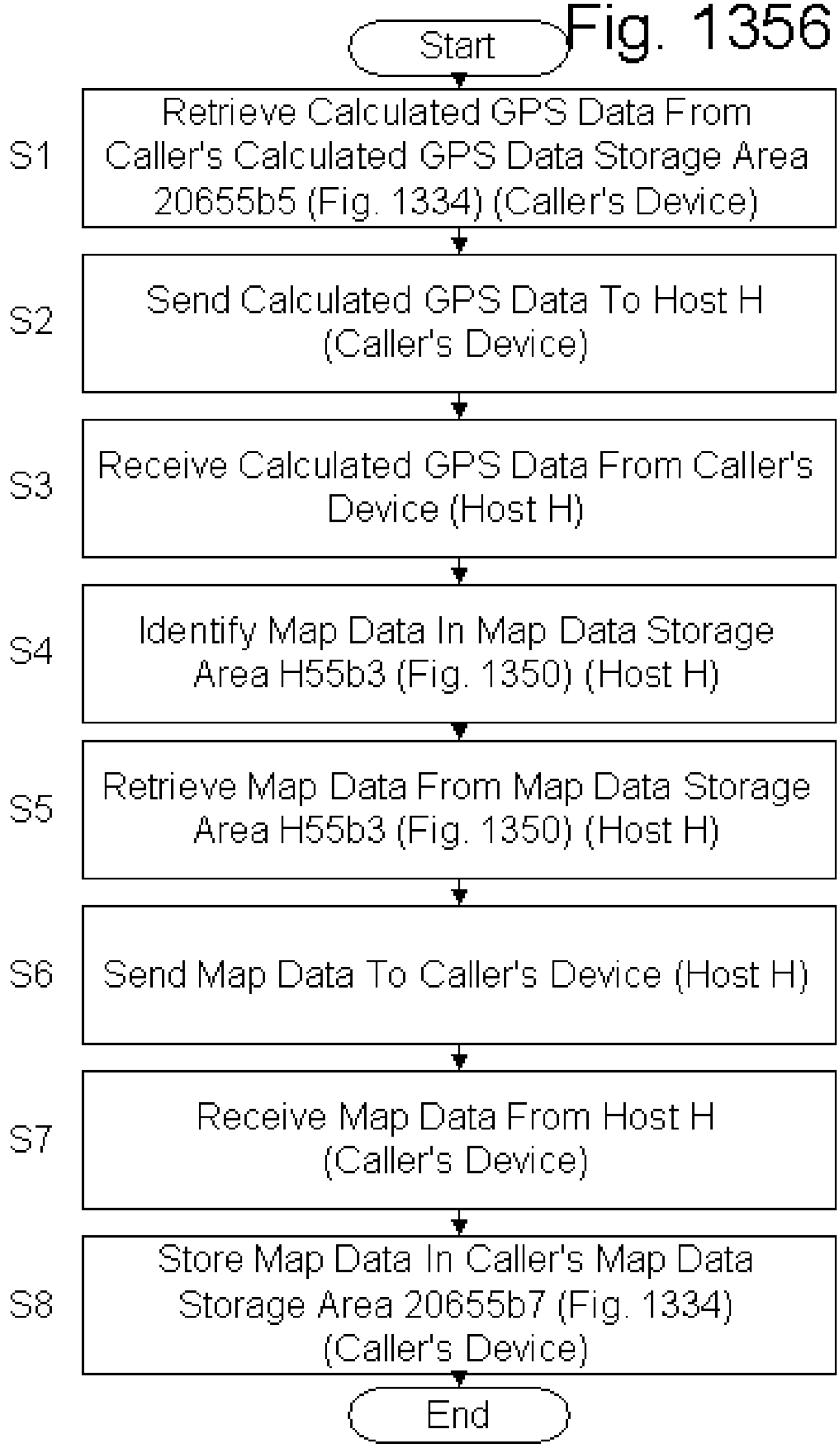

Fig. 1357
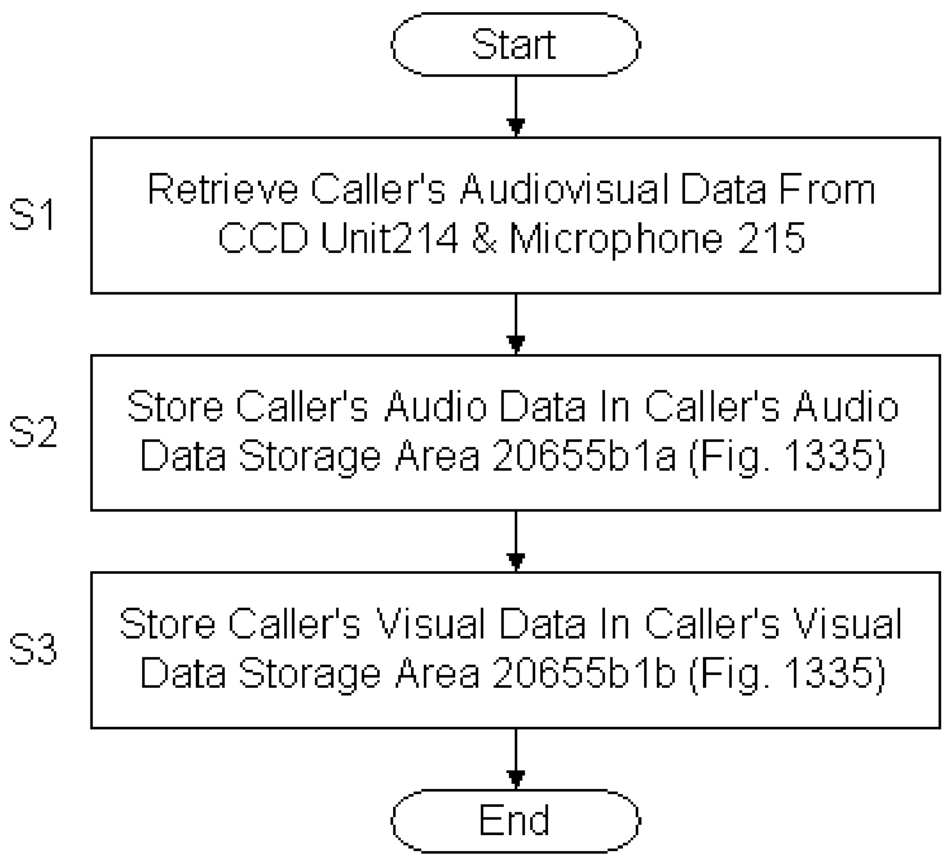

Fig. 1358
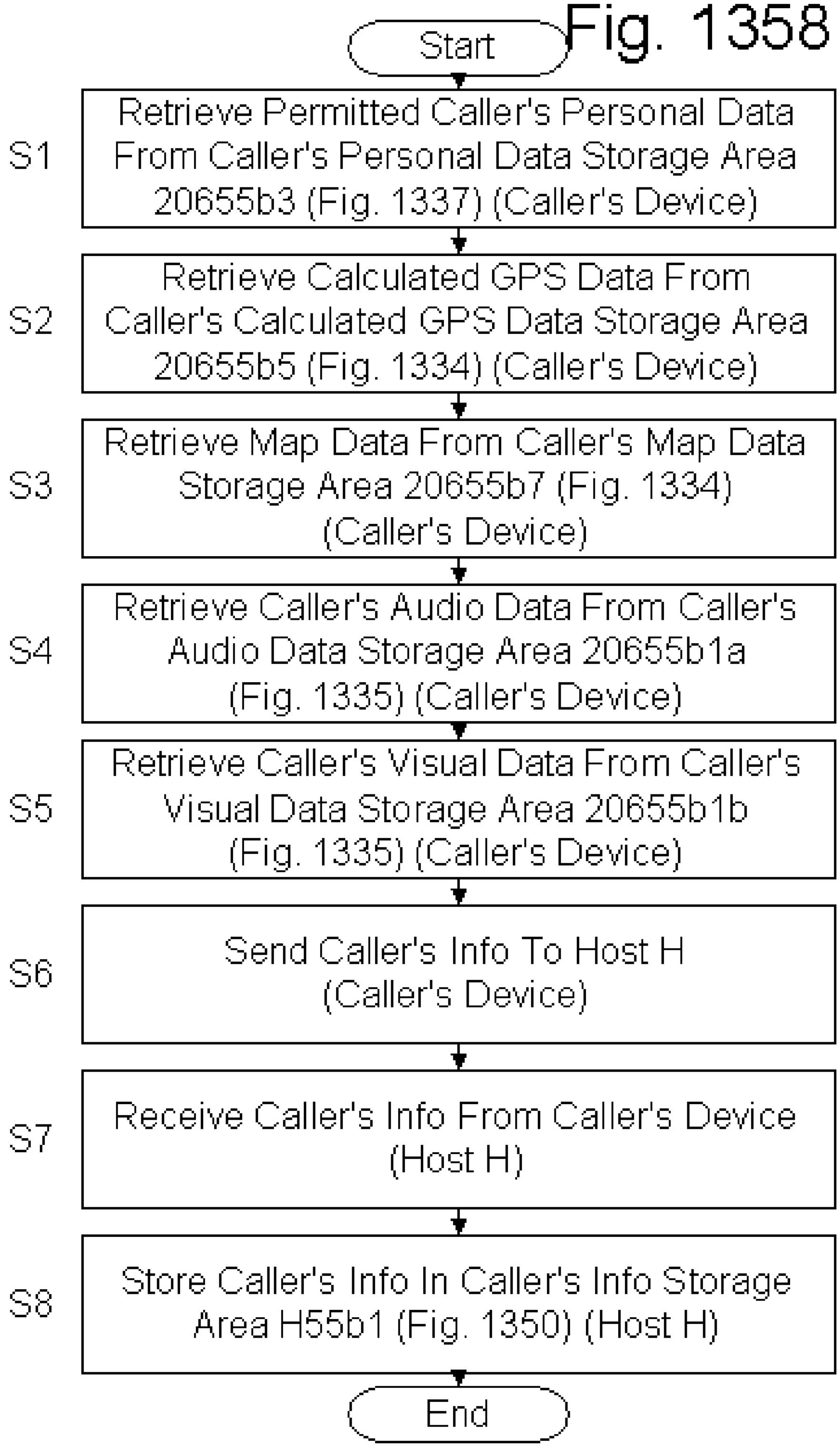

Fig. 1359
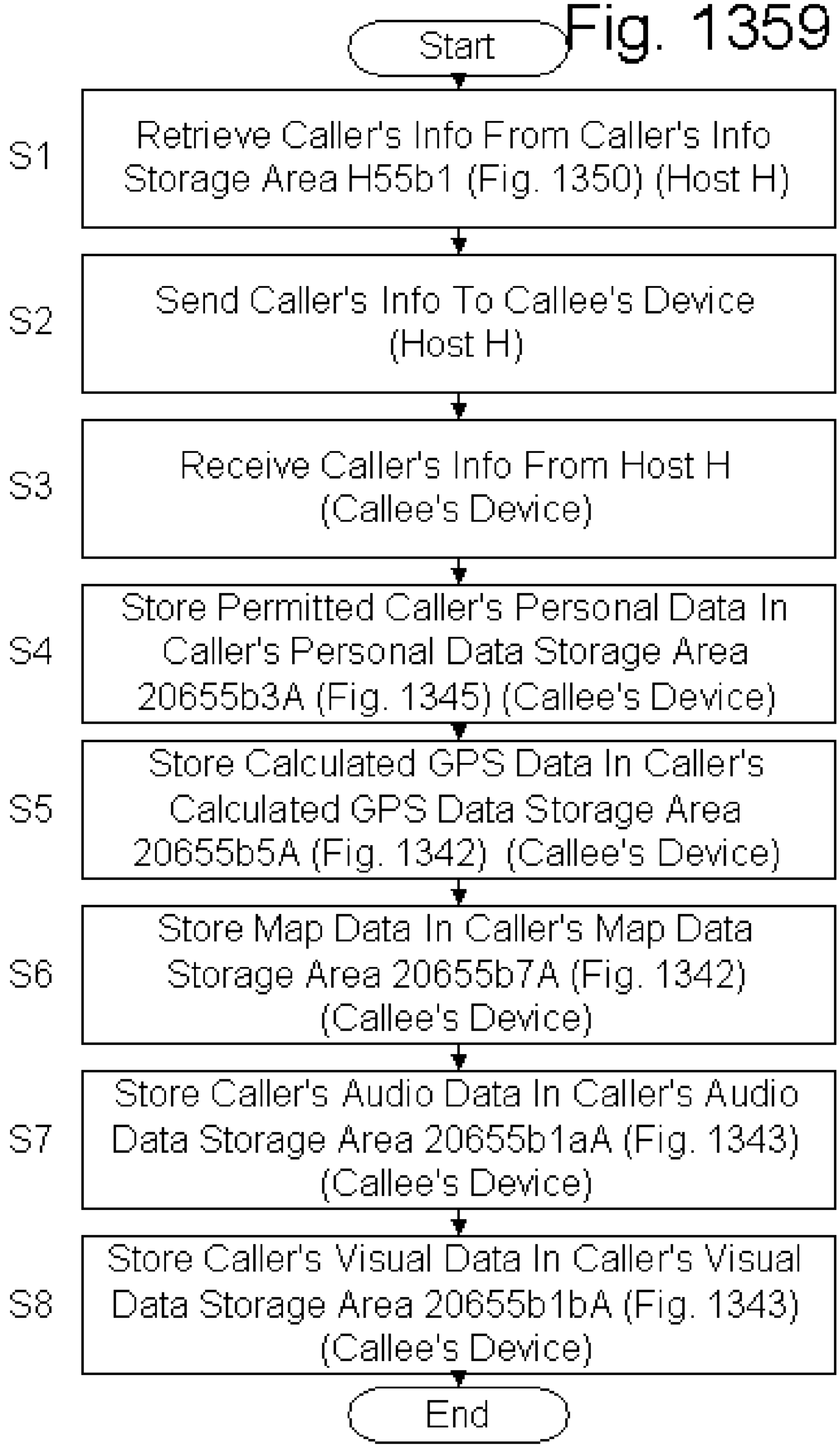

Fig. 1360
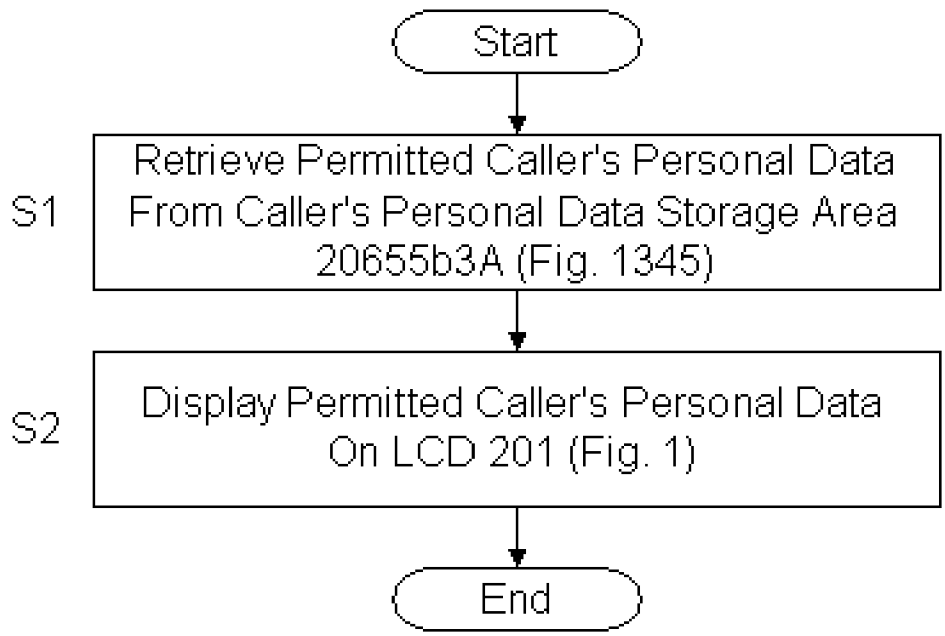

Fig. 1361
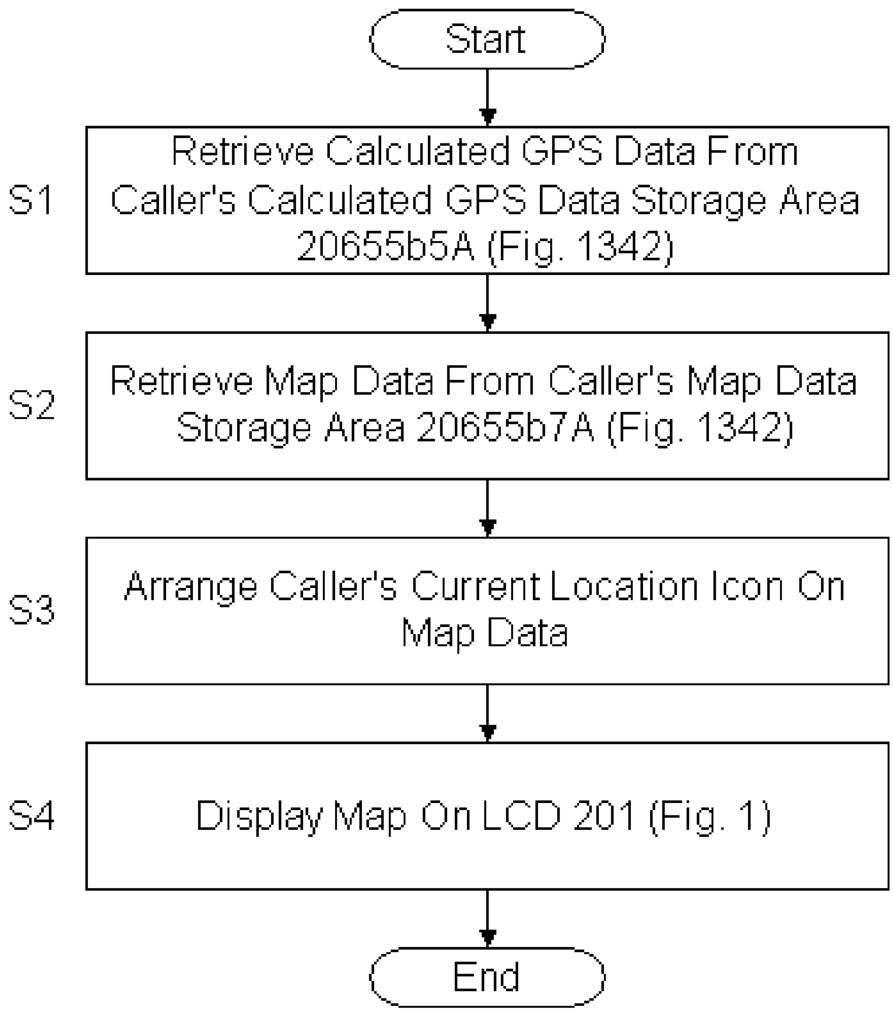

Fig. 1362
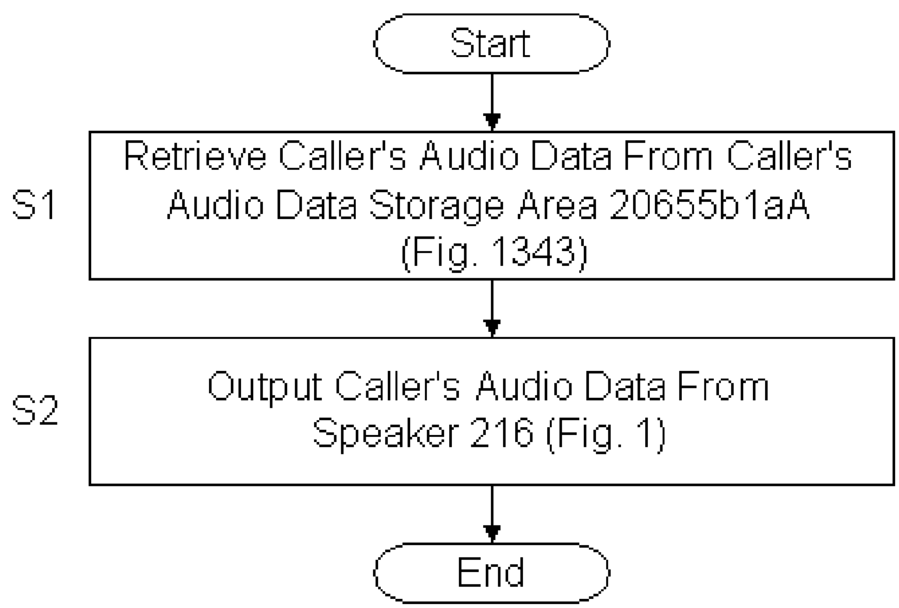

Fig. 1363
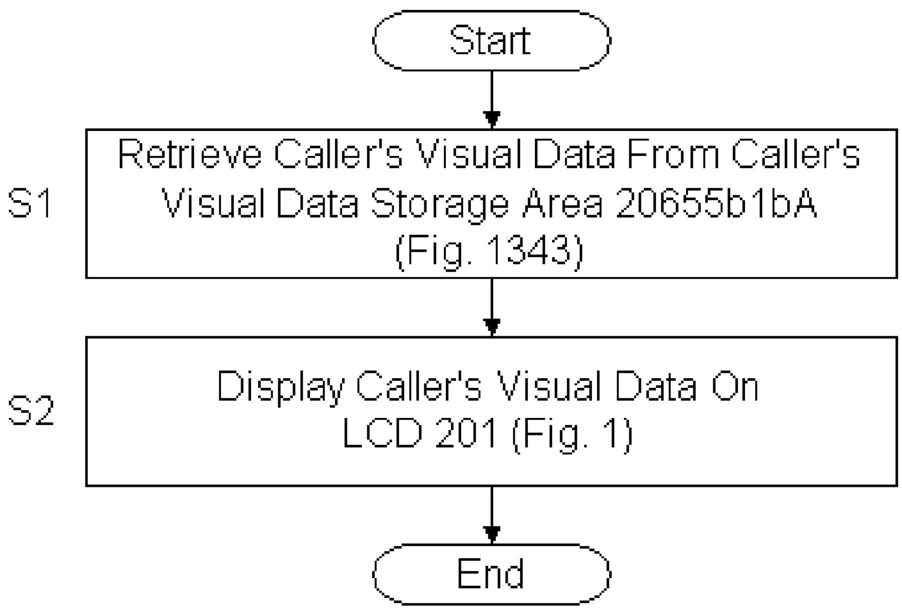

Fig. 1364
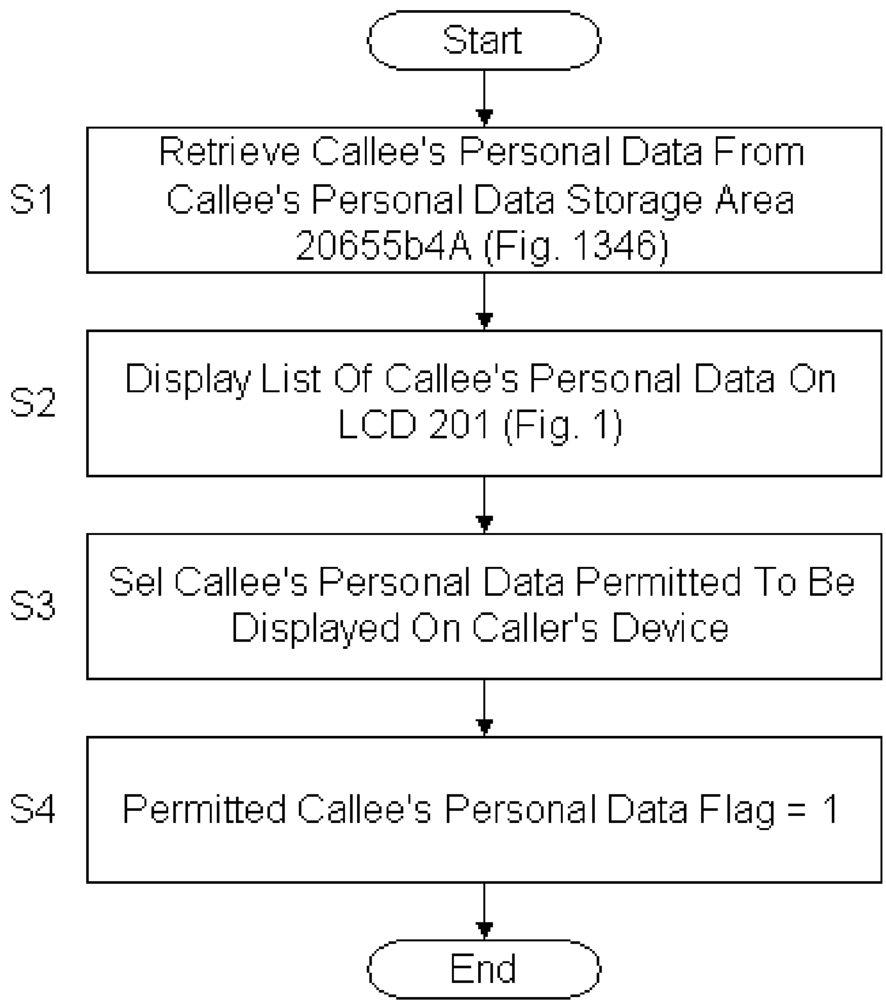

Fig. 1365
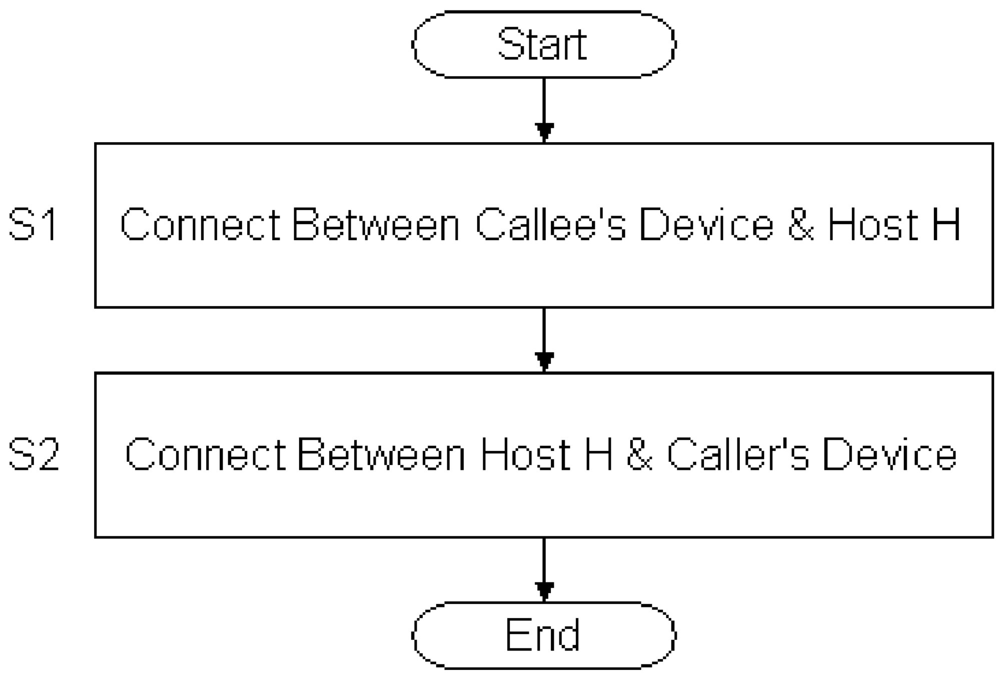

Fig. 1366
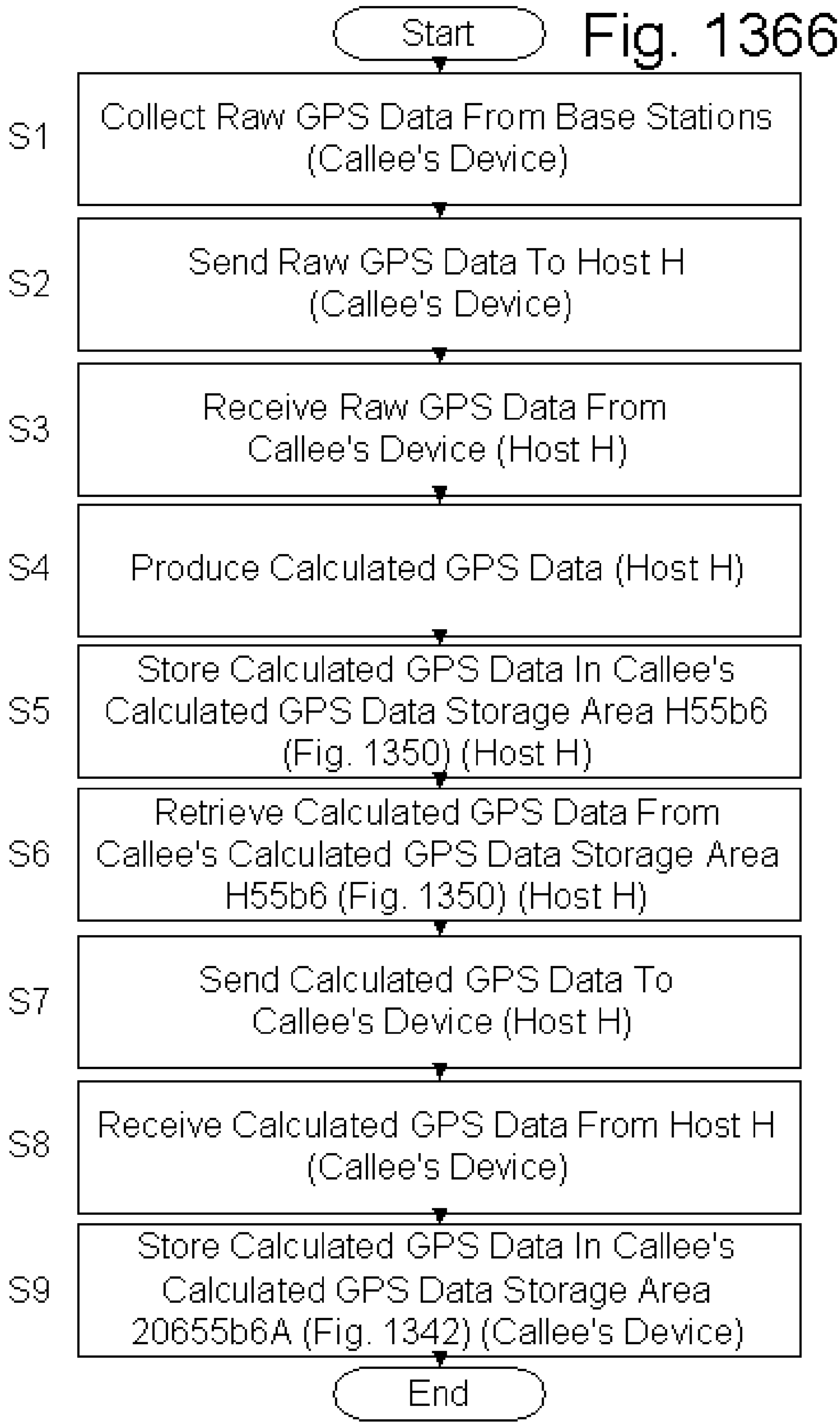

Fig. 1367
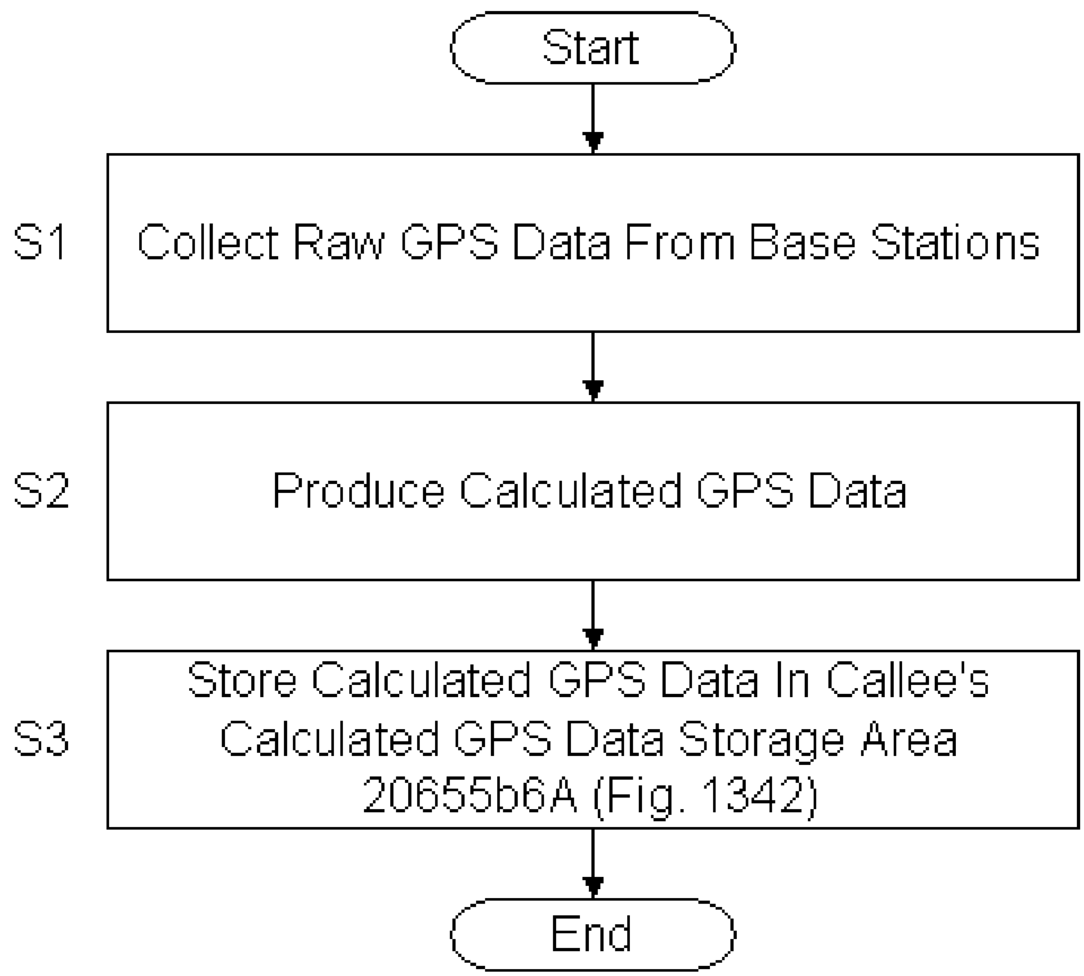

Fig. 1368
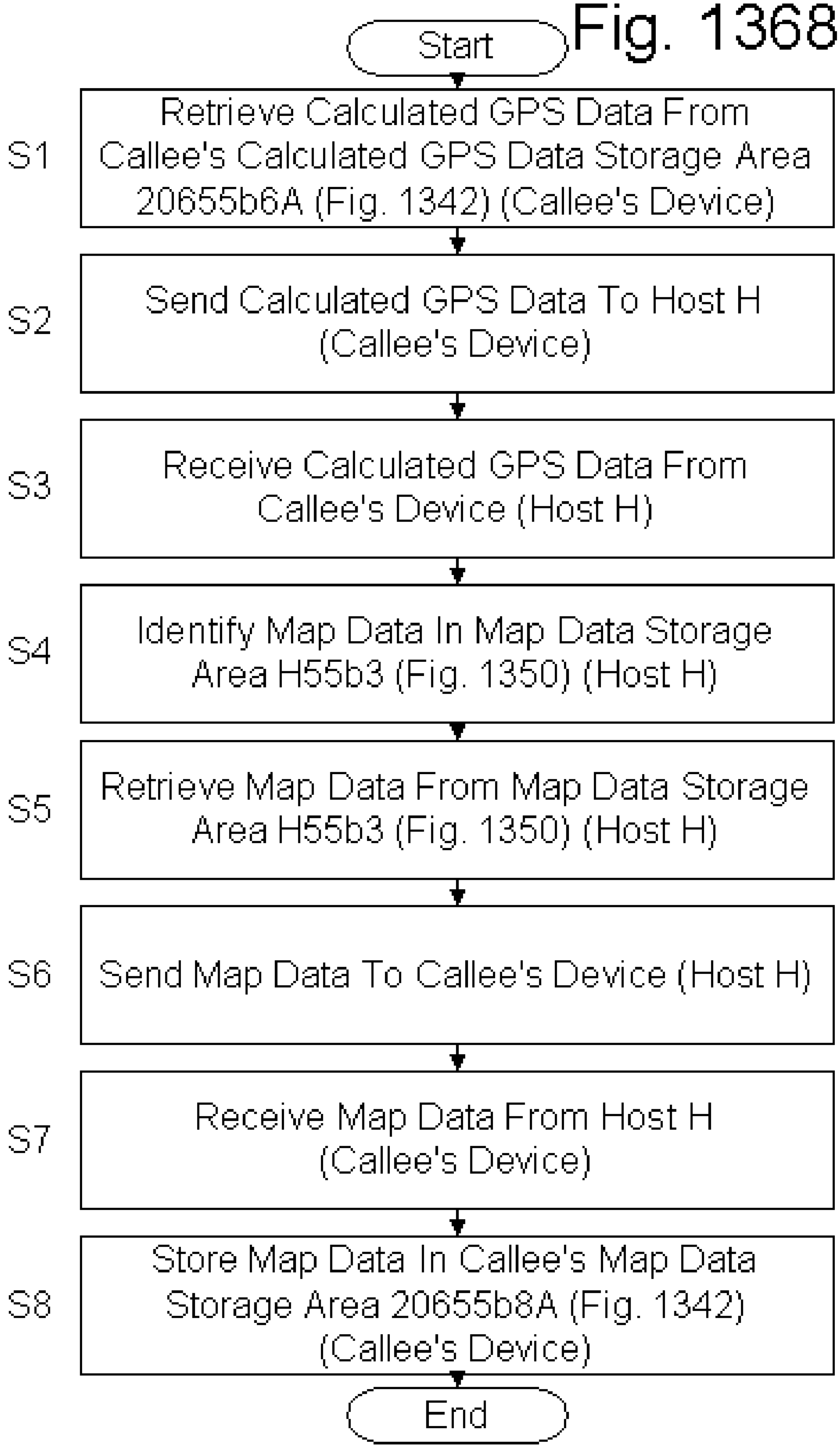

Fig. 1369
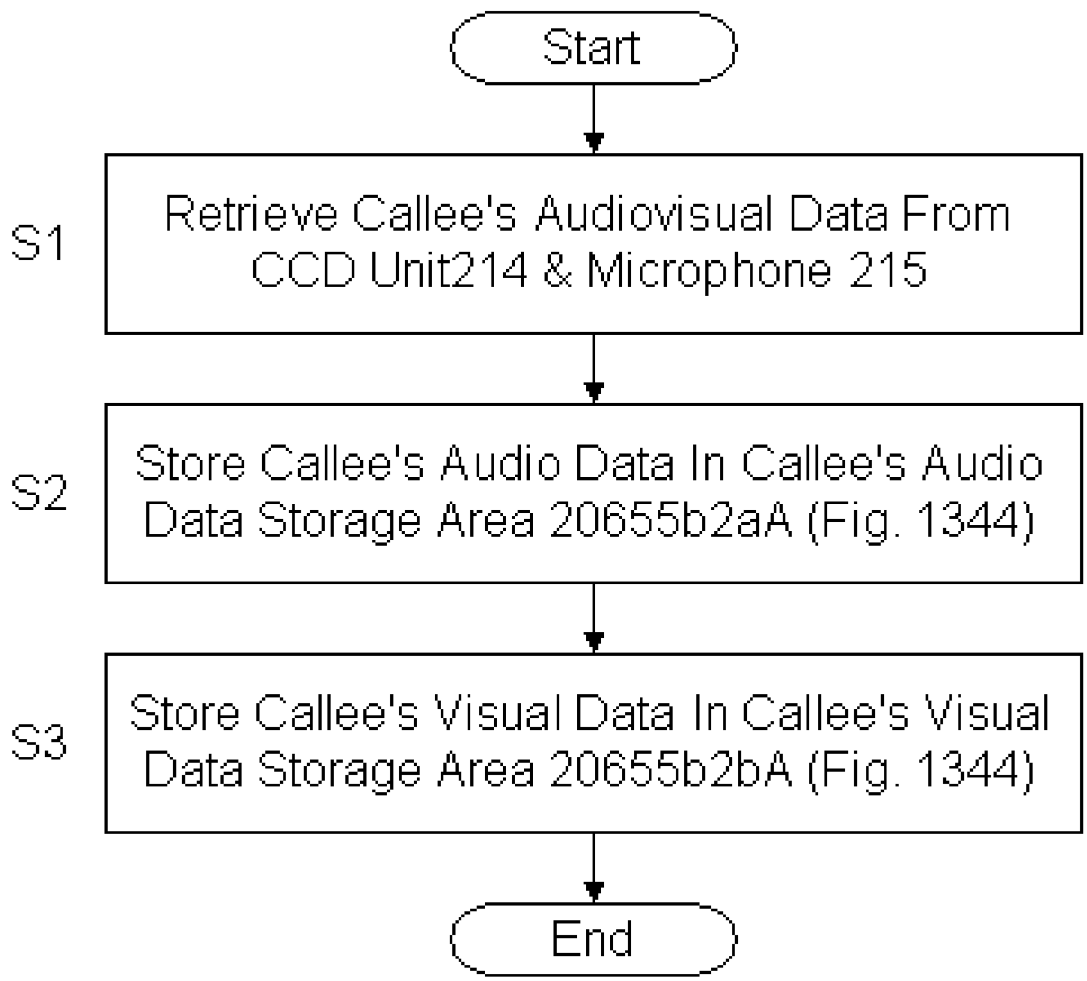

Fig. 1370
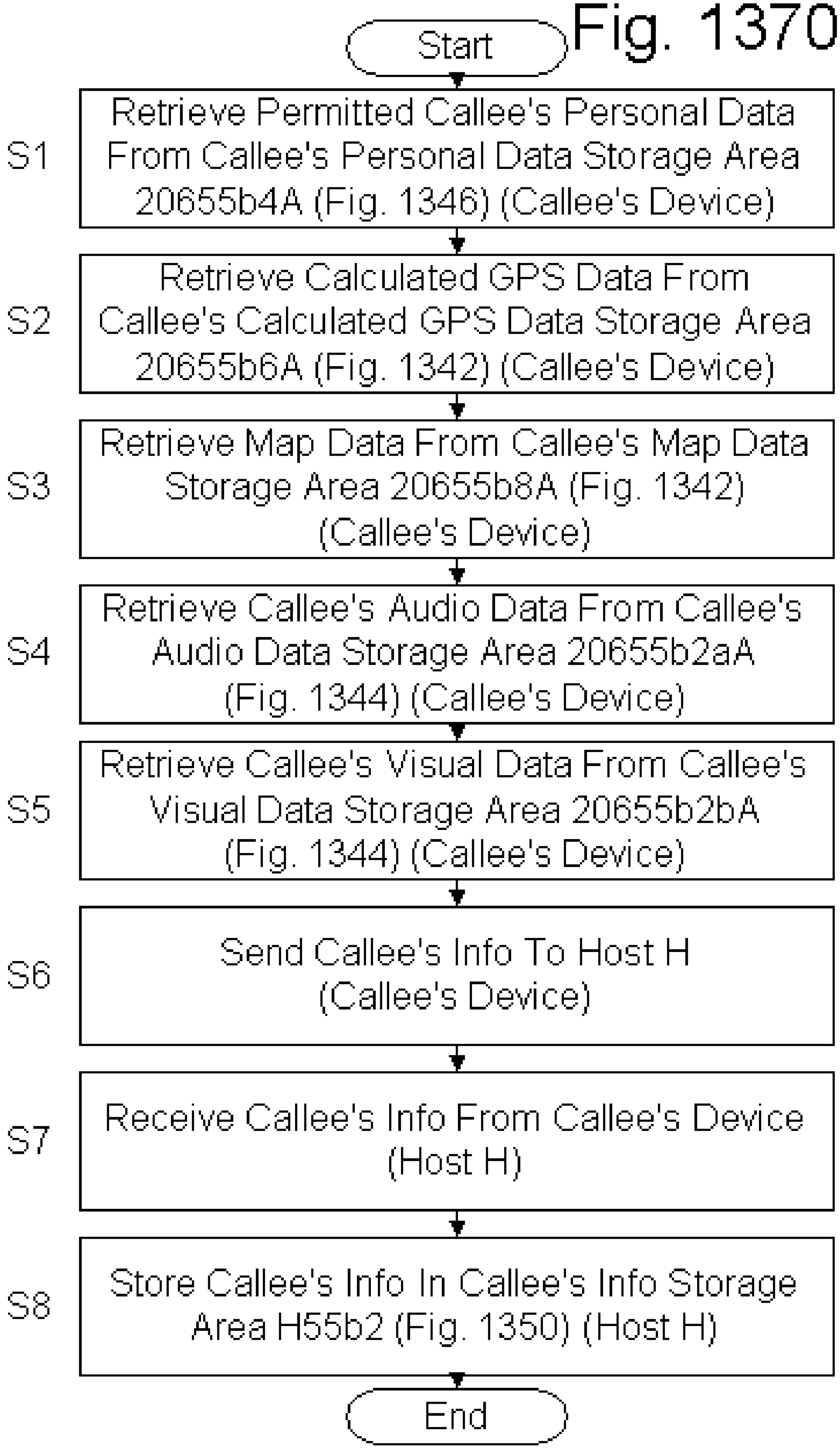

Fig. 1371
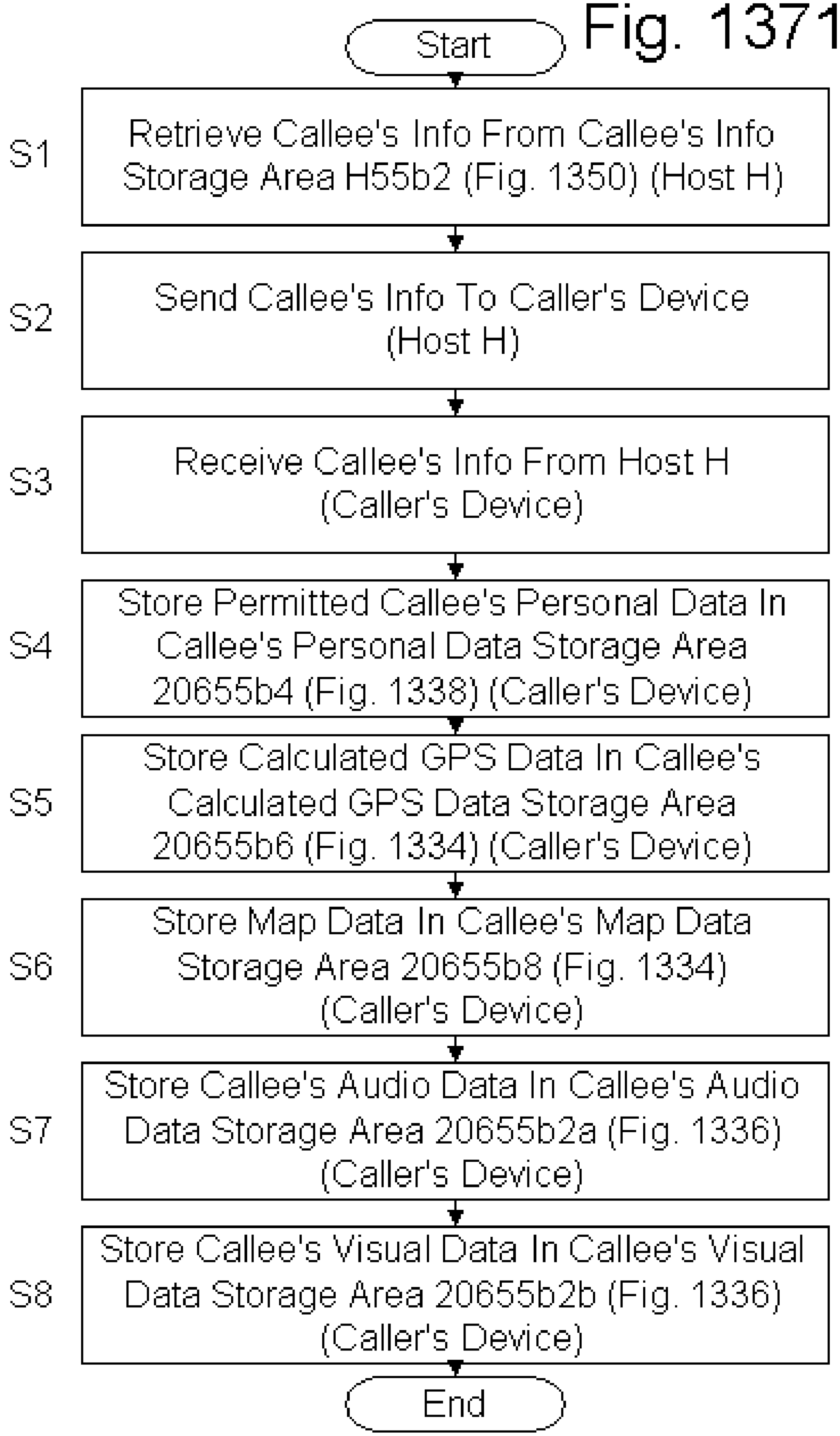

Fig. 1372
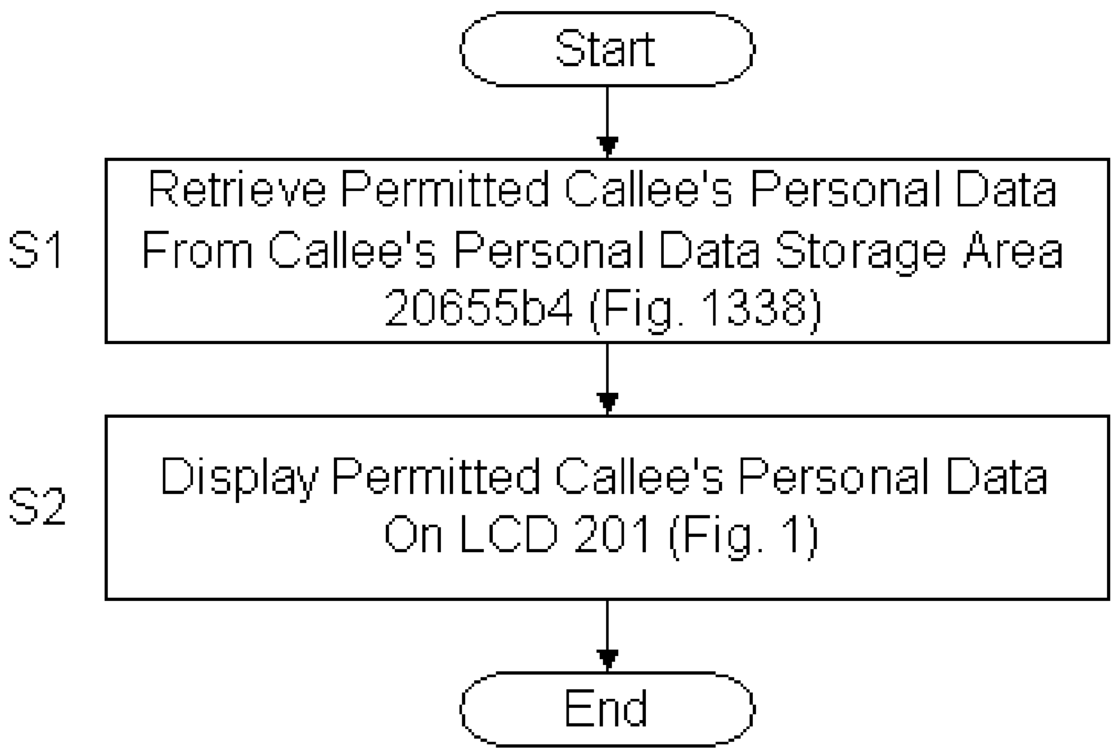

Fig. 1373
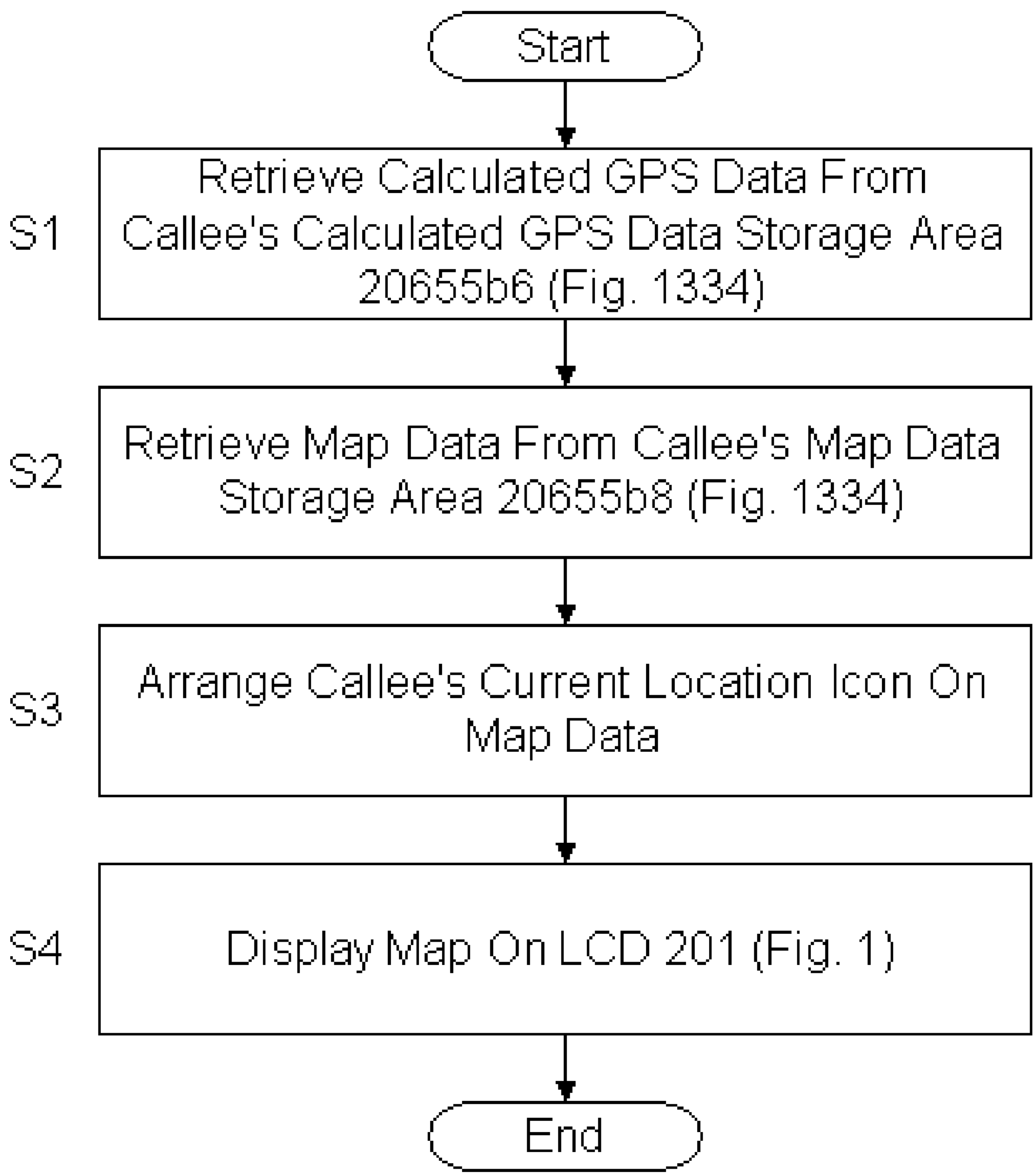

Fig. 1374
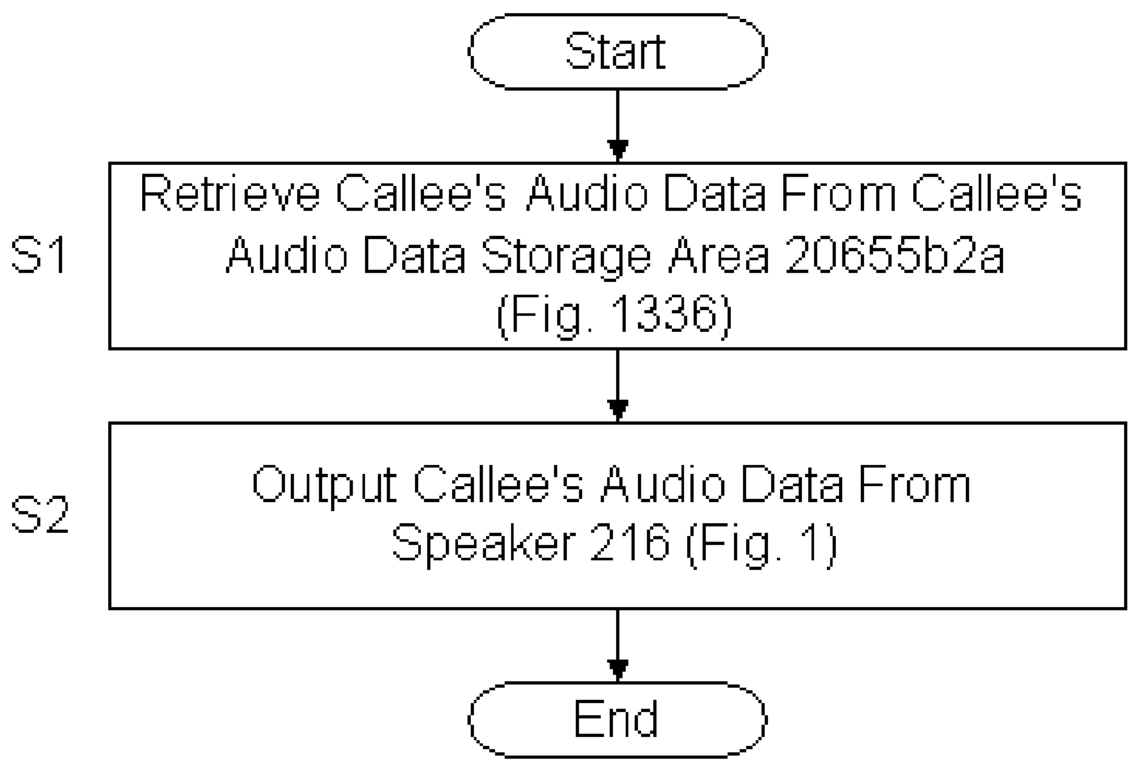

Fig. 1375
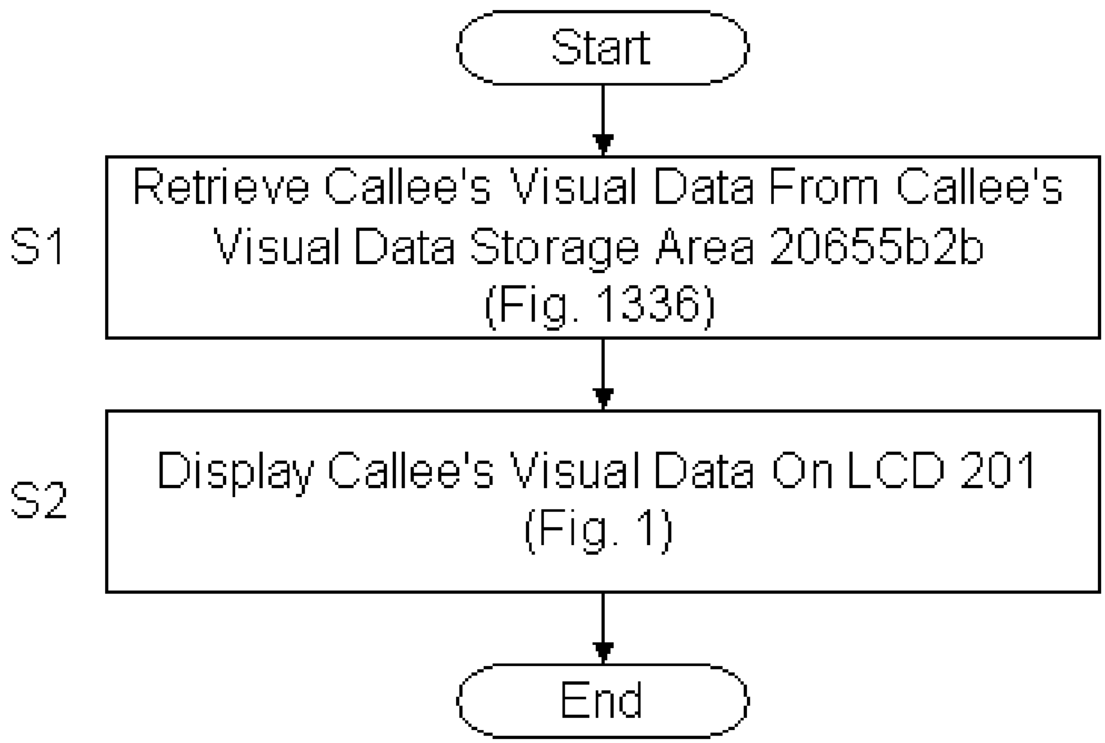

Fig. 1376
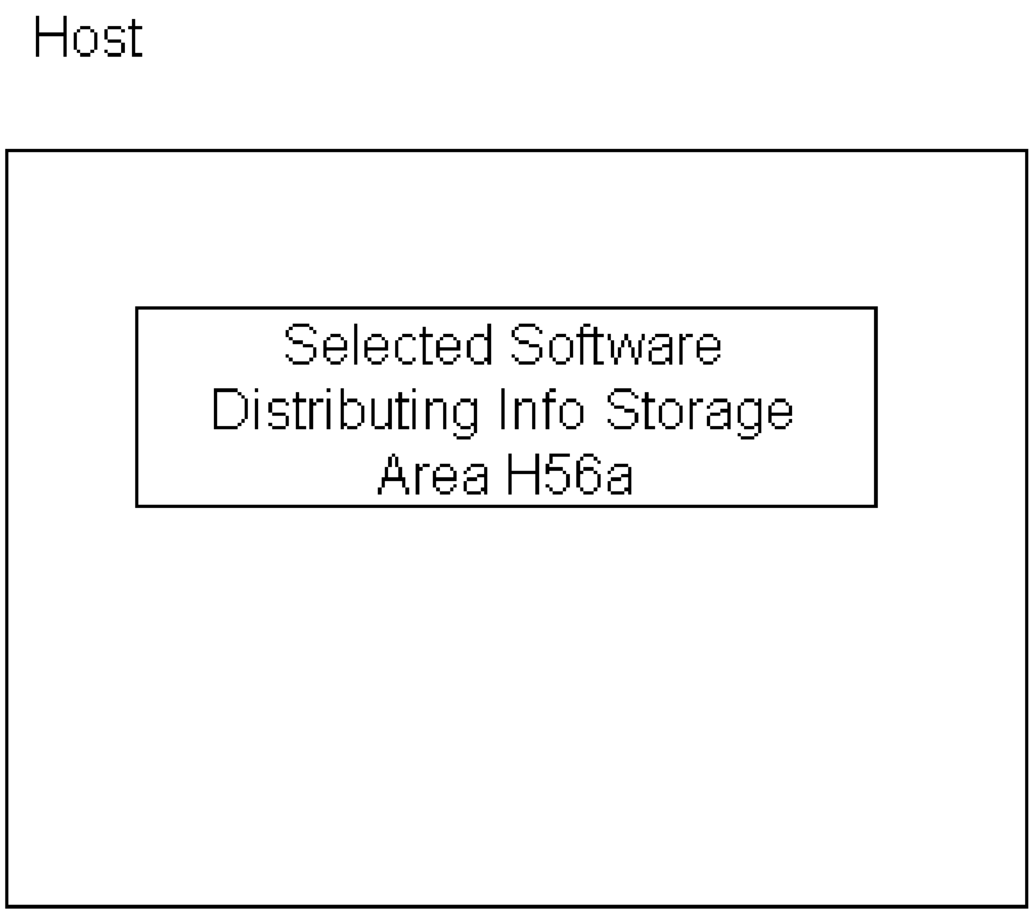

Fig. 1377
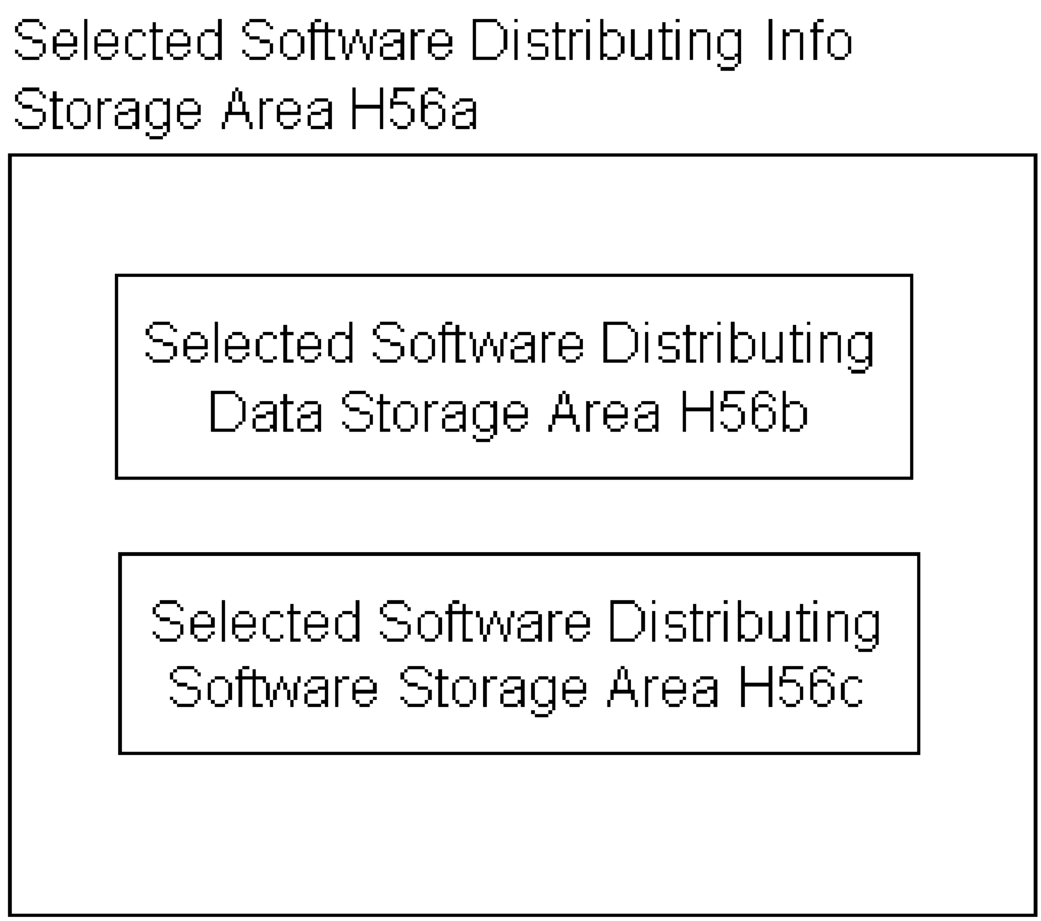

Fig. 1378
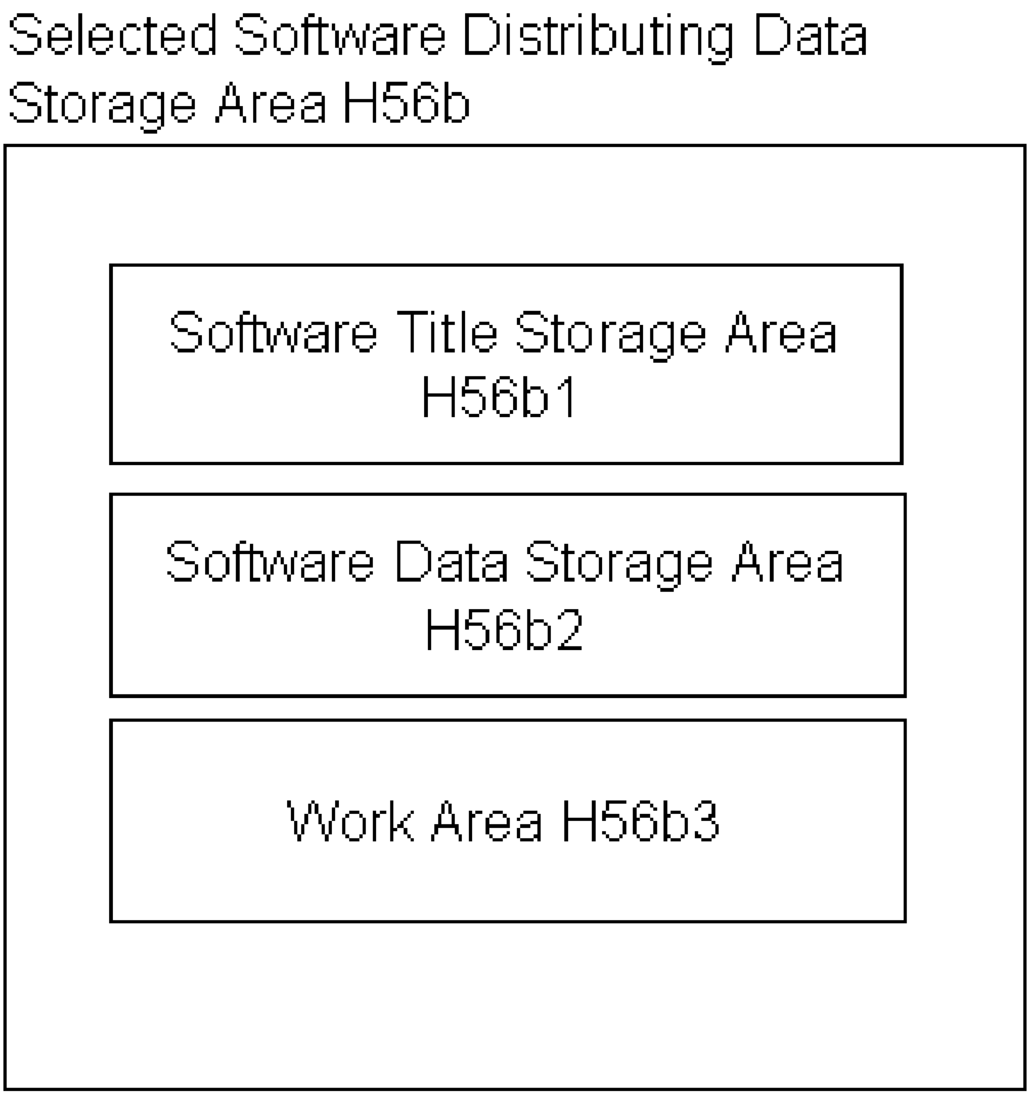

Fig. 1379

Software Title Storage Area H56b1

| Software ID | Software Title |
|---|---|
| Software #1 | Software Title #1 |
| Software #2 | Software Title #2 |
| Software #3 | Software Title #3 |
| Software #4 | Software Title #4 |
| Software #5 | Software Title #5 |

Fig. 1380

Software Data Storage Area H56b2

| Software ID | Software Data |
|---|---|
| Software #1 | Software Data #1 |
| Software #2 | Software Data #2 |
| Software #3 | Software Data #3 |
| Software #4 | Software Data #4 |
| Software #5 | Software Data #5 |

Fig. 1381
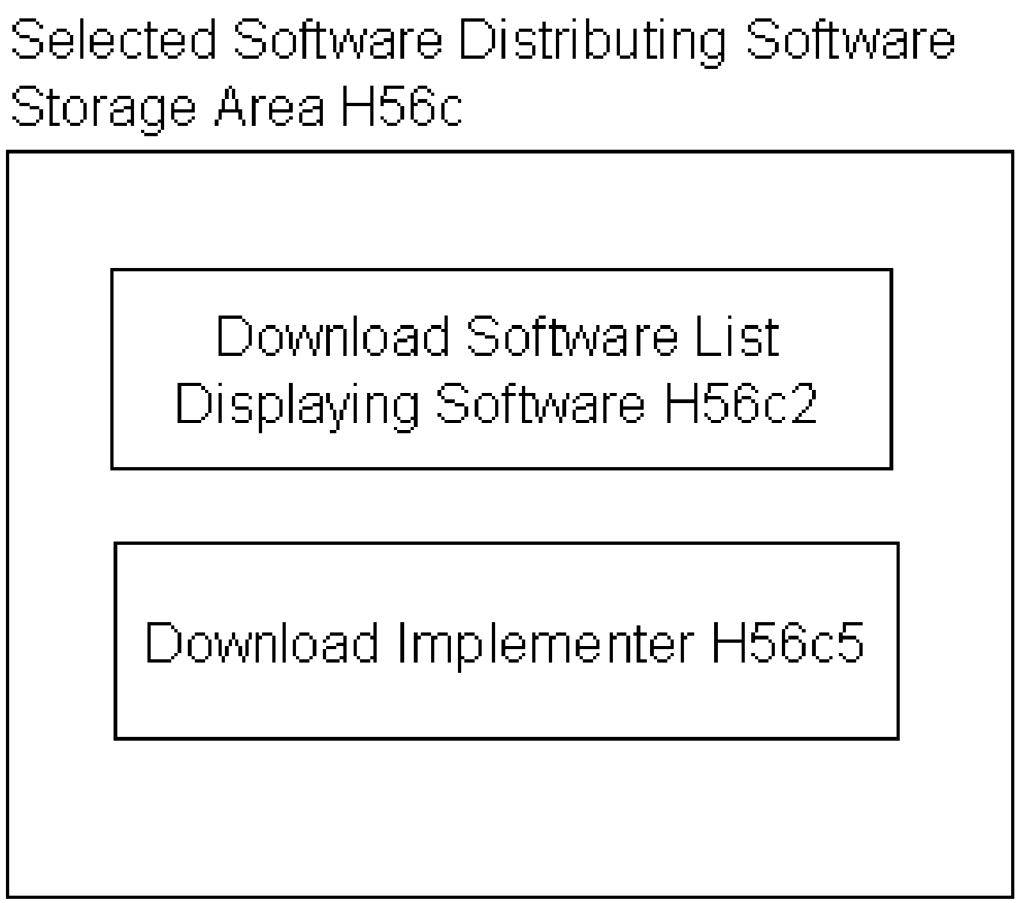

Fig. 1382
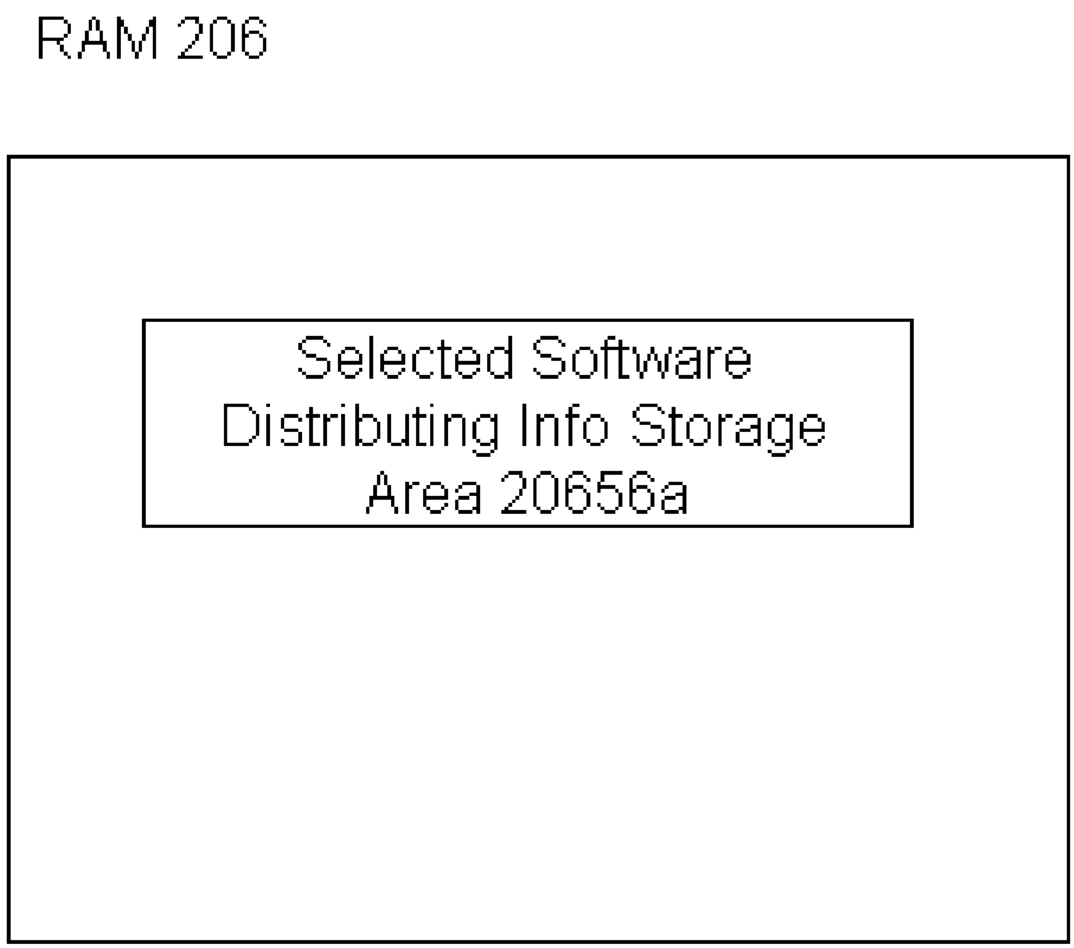

Fig. 1383
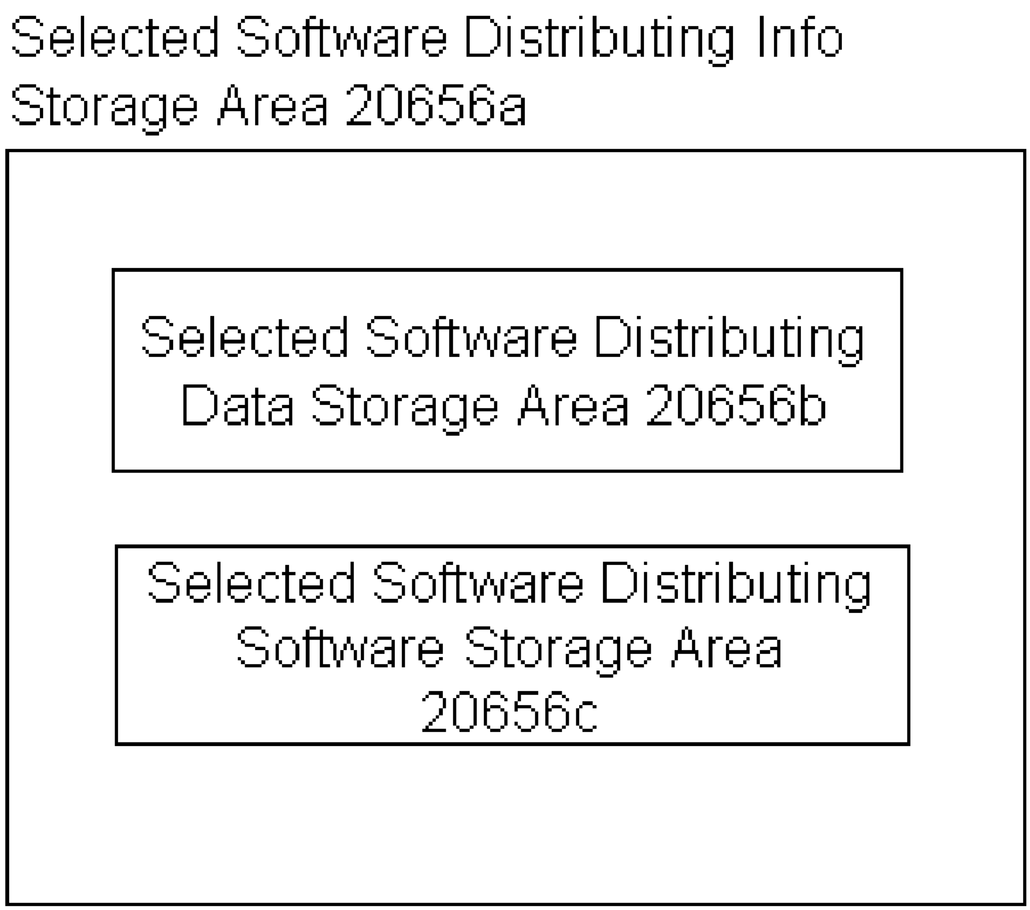

Fig. 1384
Selected Software Distributing Data Storage Area 20656b
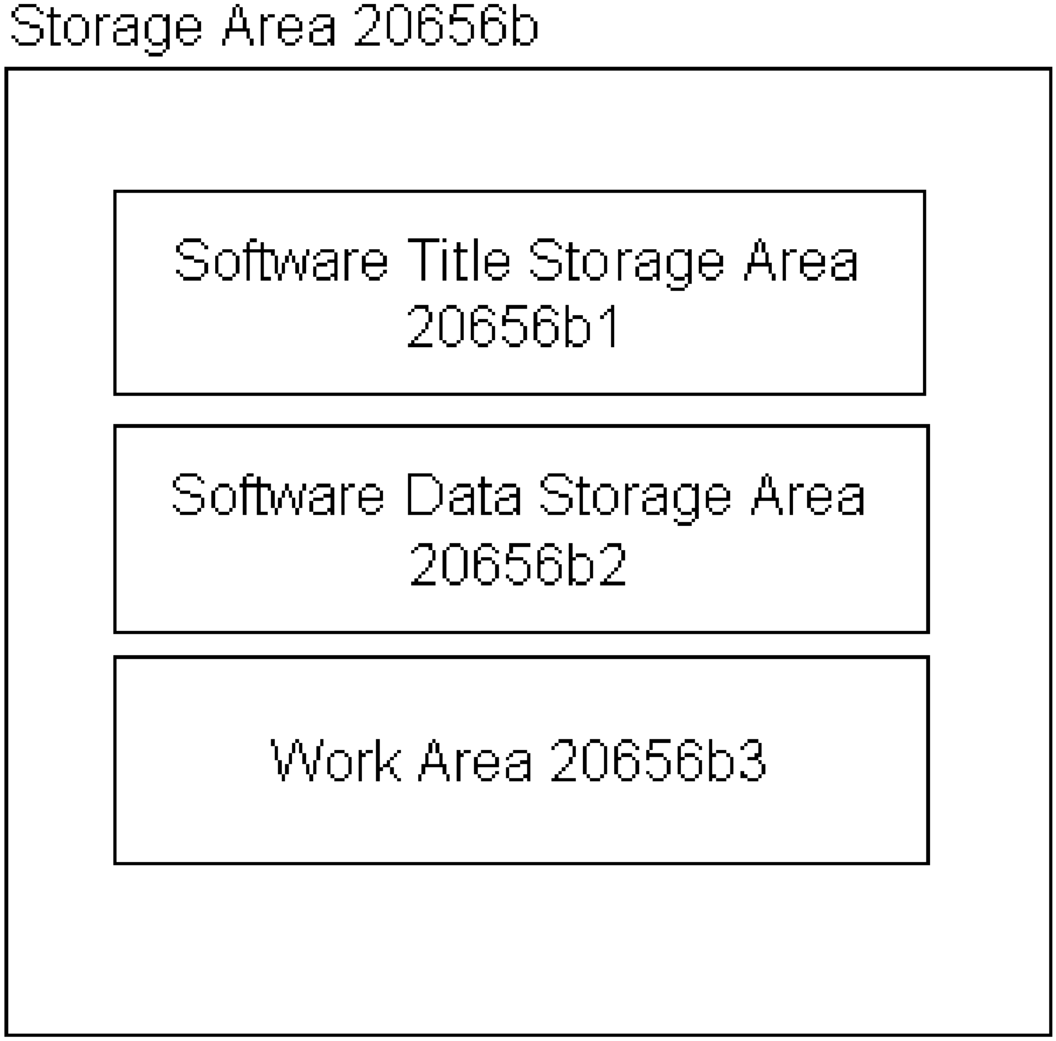

Fig. 1385

Software Title Storage Area 20656b1

| Software ID | Software Title |
|---|---|
| Software #1 | Software Title #1 |
| Software #2 | Software Title #2 |
| Software #3 | Software Title #3 |
| Software #4 | Software Title #4 |
| Software #5 | Software Title #5 |

Fig. 1386

Software Data Storage Area 20656b2

| Software ID | Software Data |
|---|---|
| Software #1 | Software Data #1 |
| Software #2 | Software Data #2 |
| Software #3 | Software Data #3 |
| Software #4 | Null |
| Software #5 | Null |

Fig. 1387
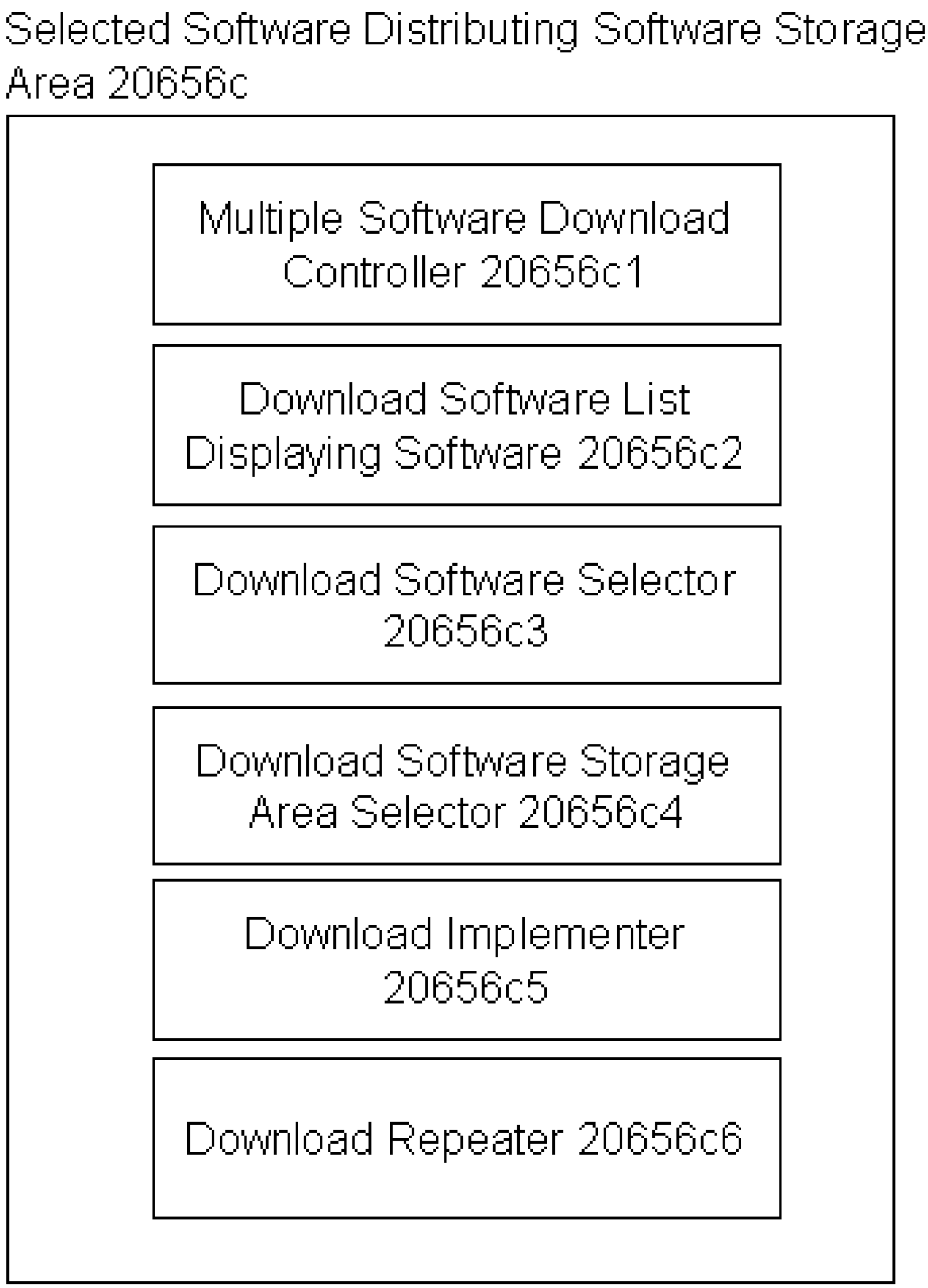

Fig. 1388
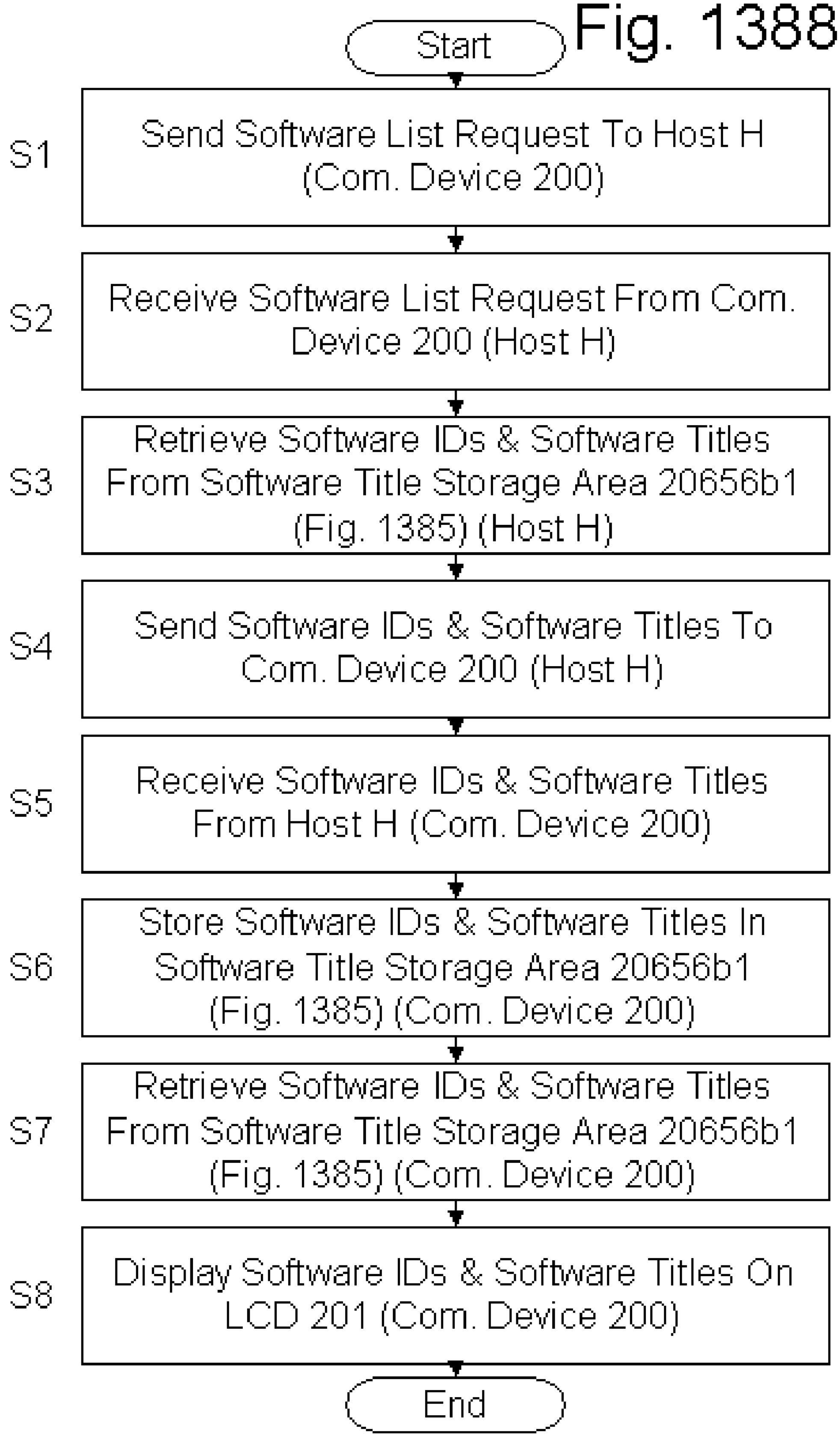

Fig. 1389
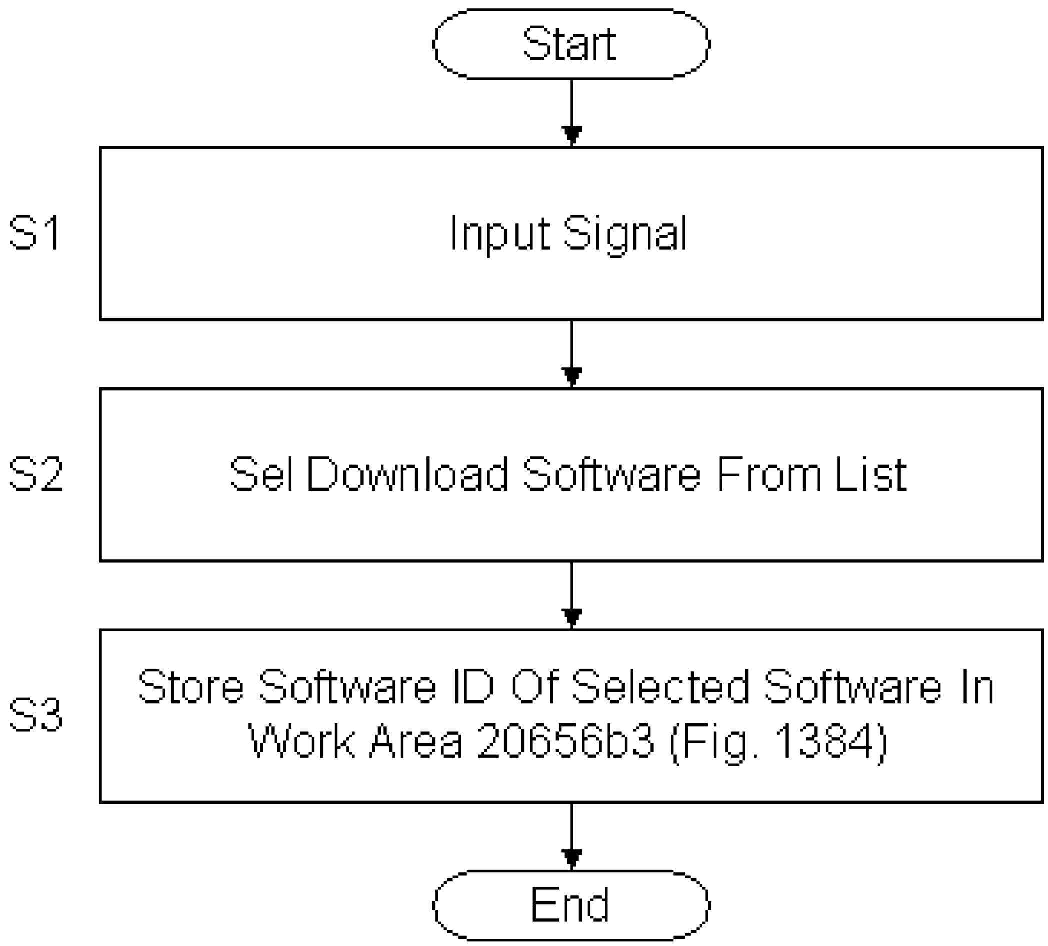

Fig. 1390
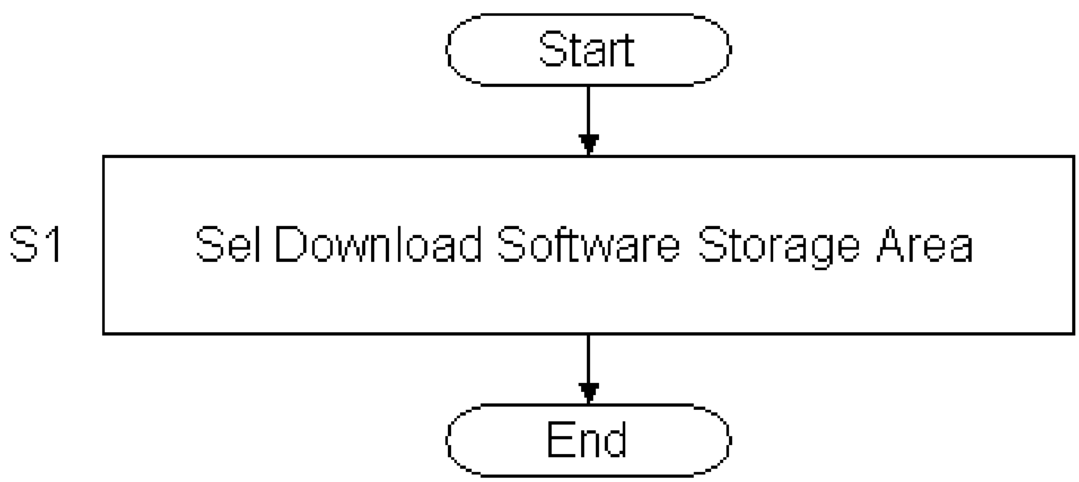

Fig. 1391
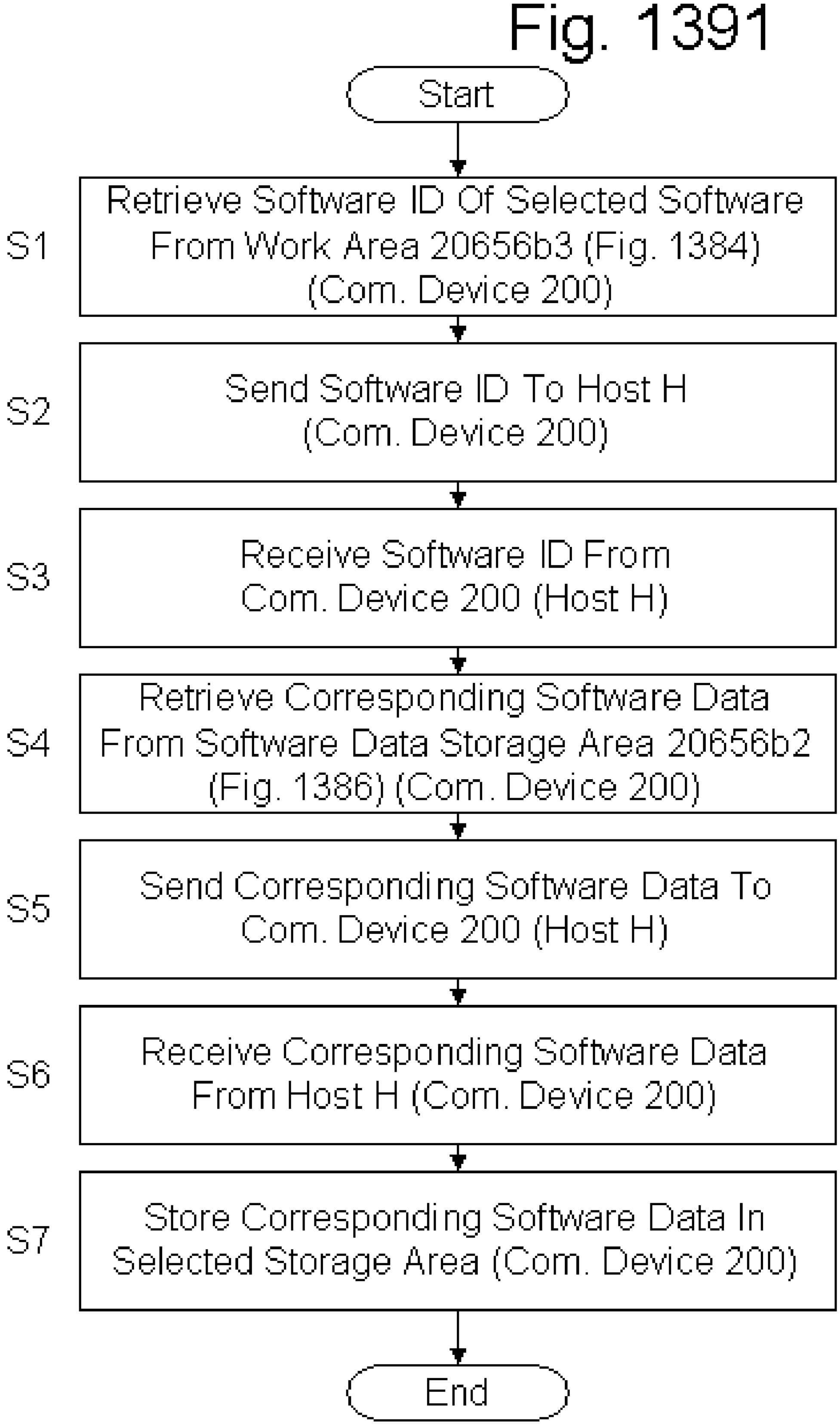

Fig. 1392
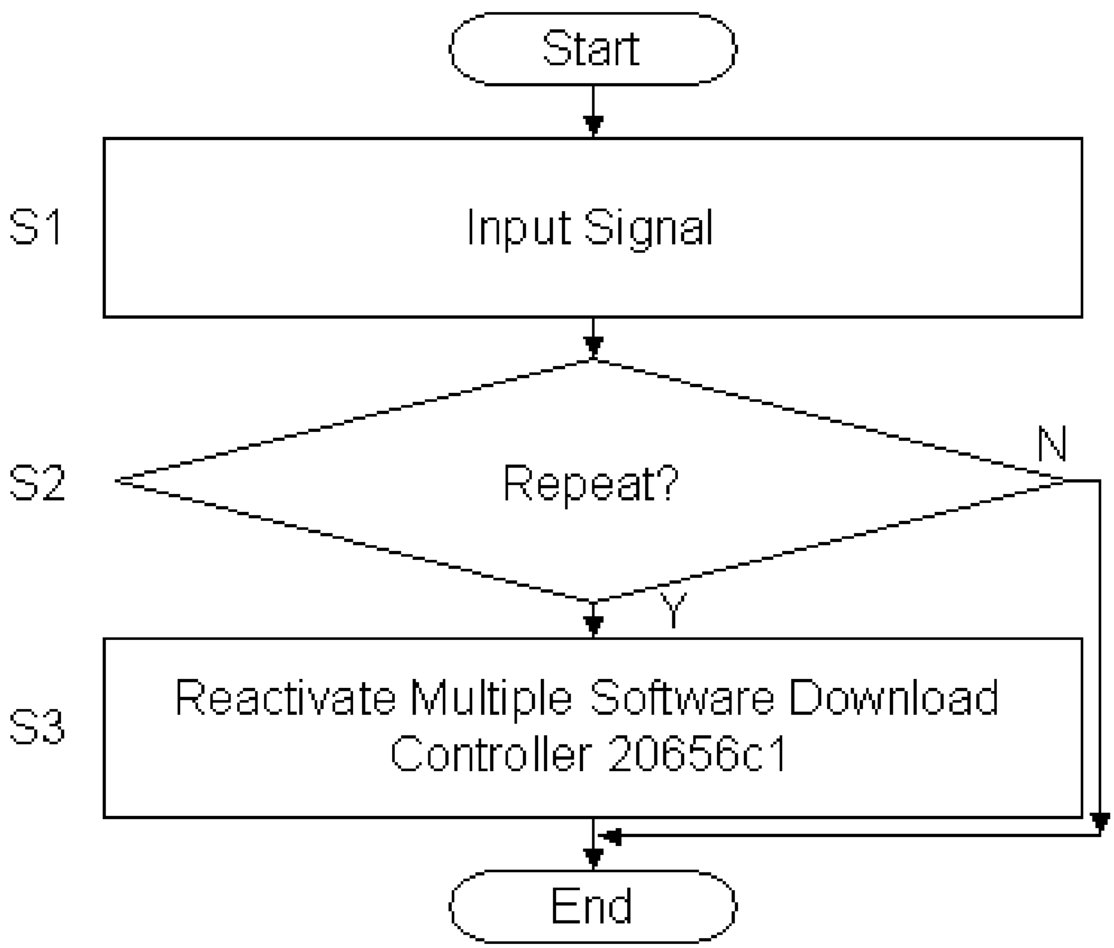

Fig. 1393a
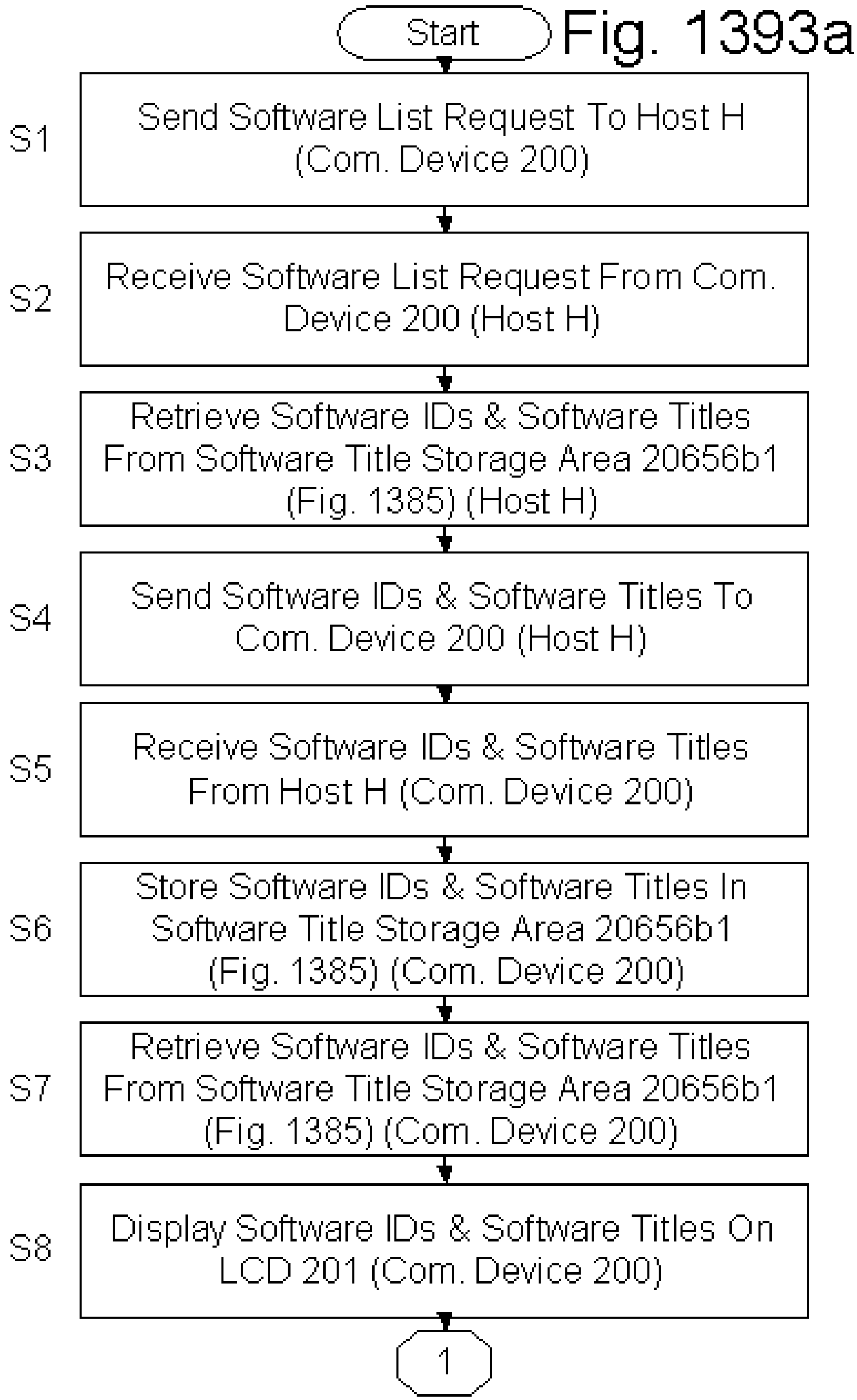

Fig. 1393b
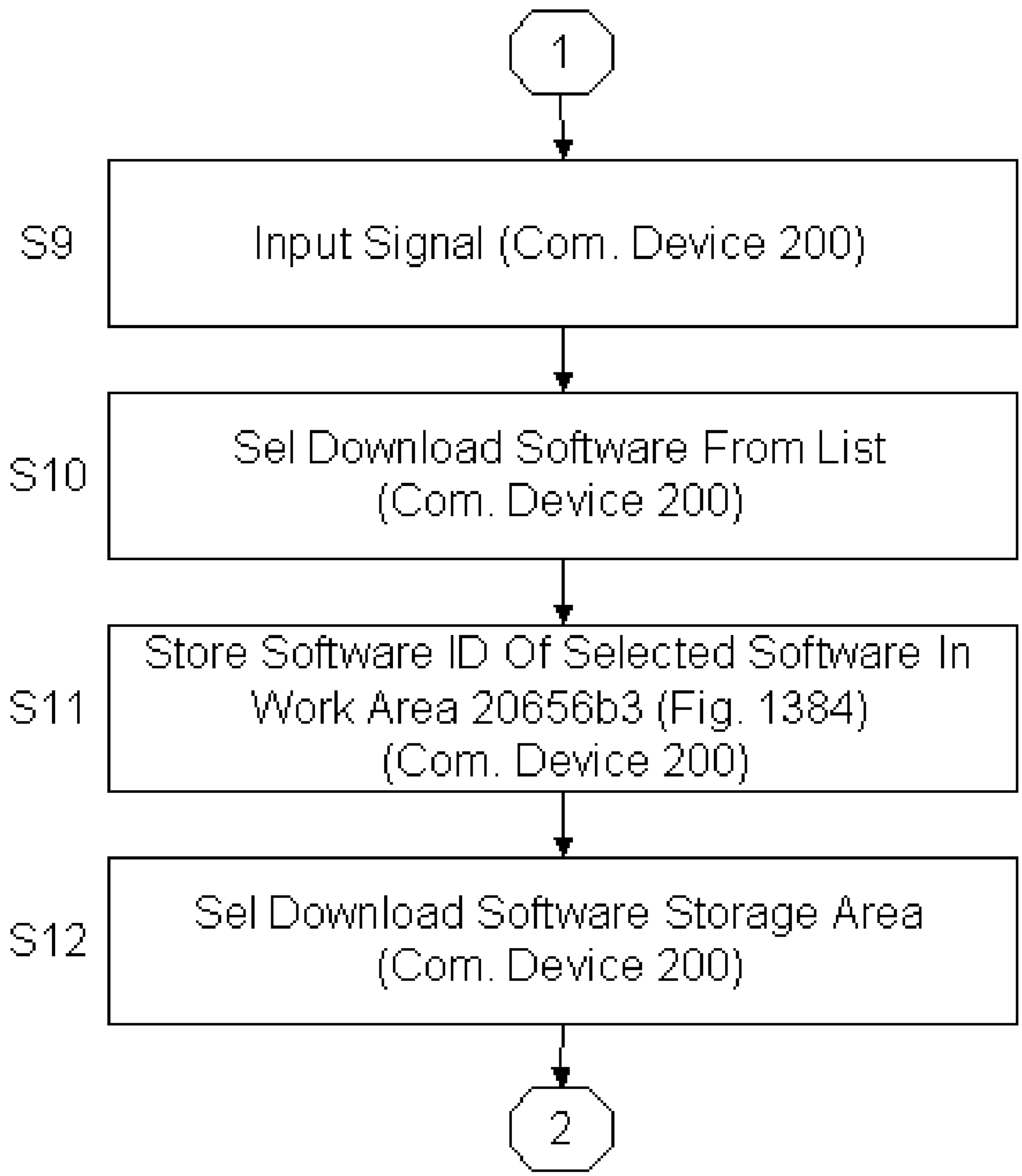

Fig. 1393c
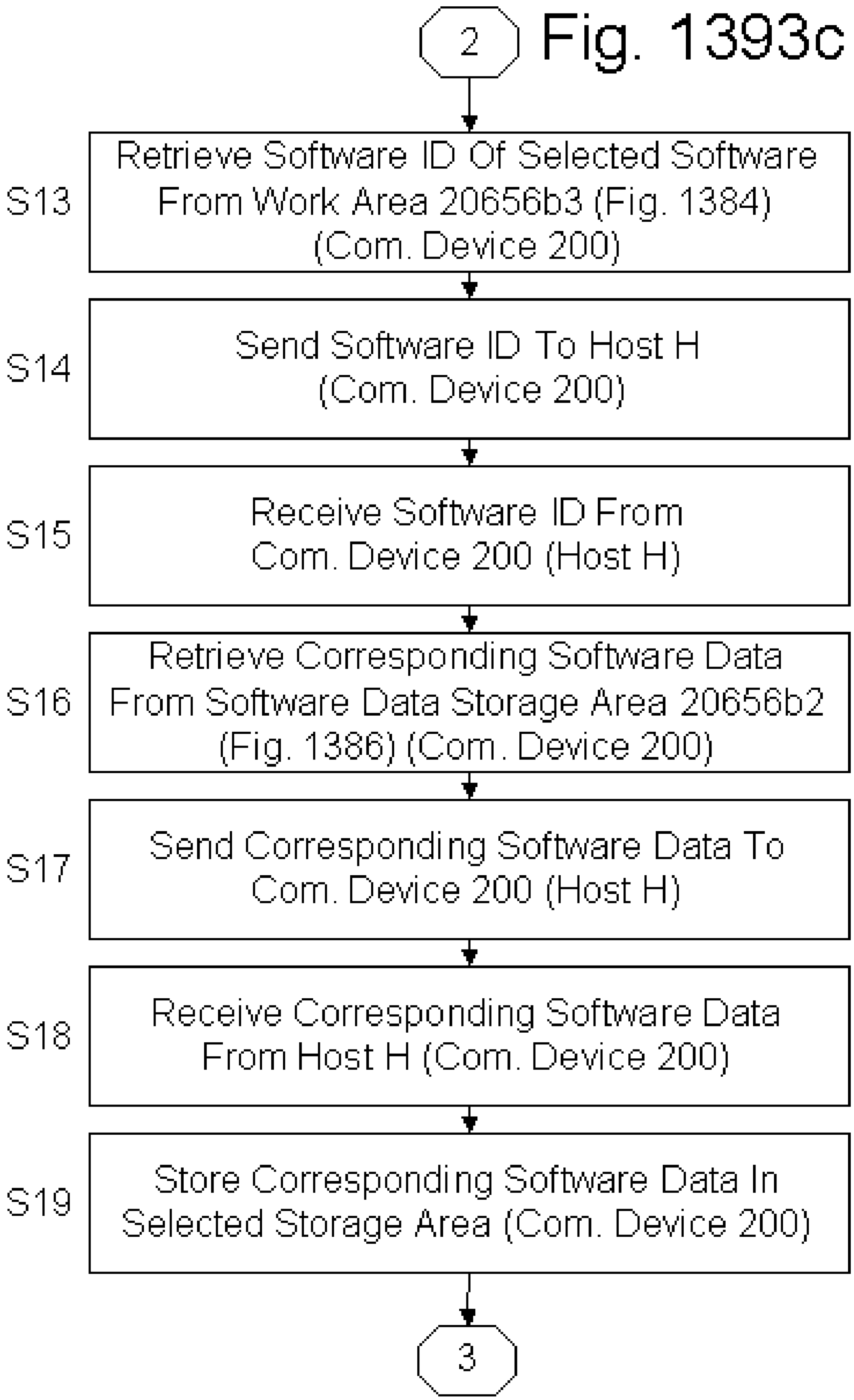

Fig. 1393d
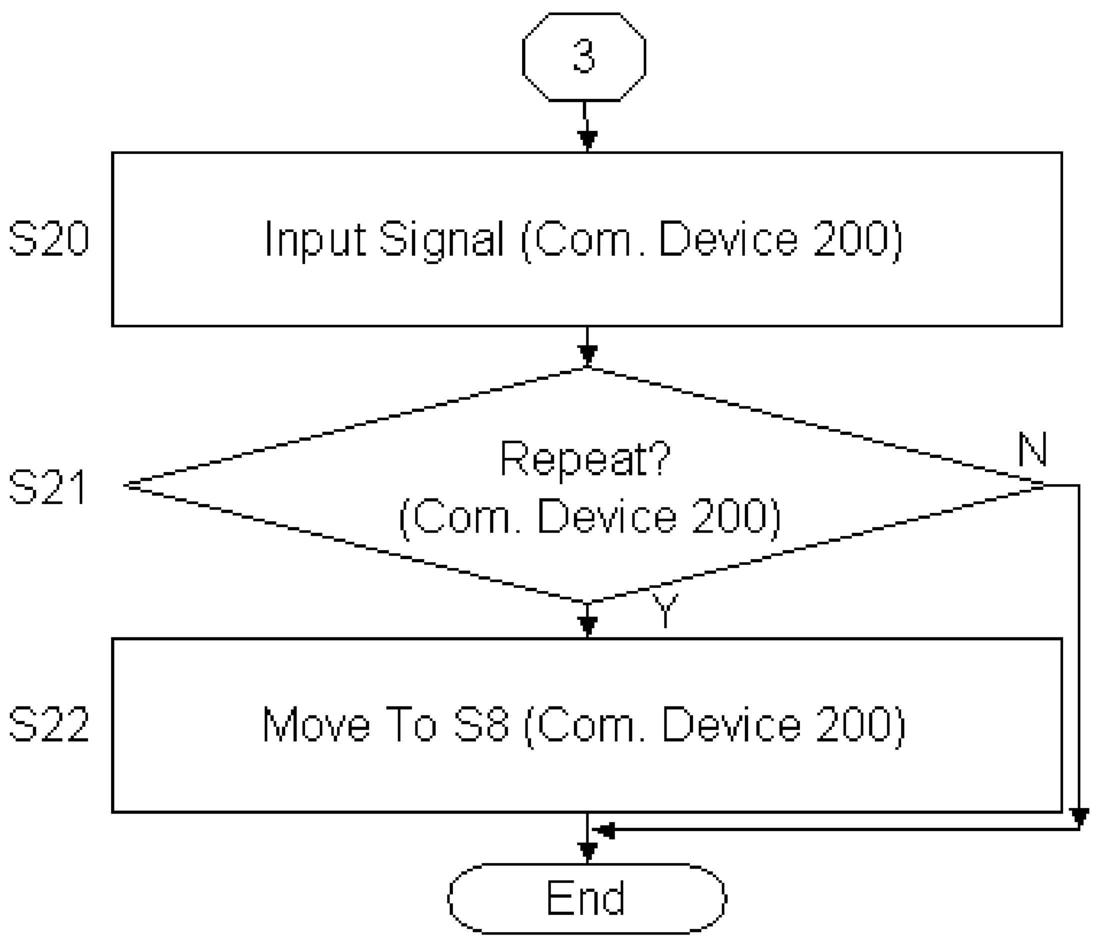

Fig. 1394
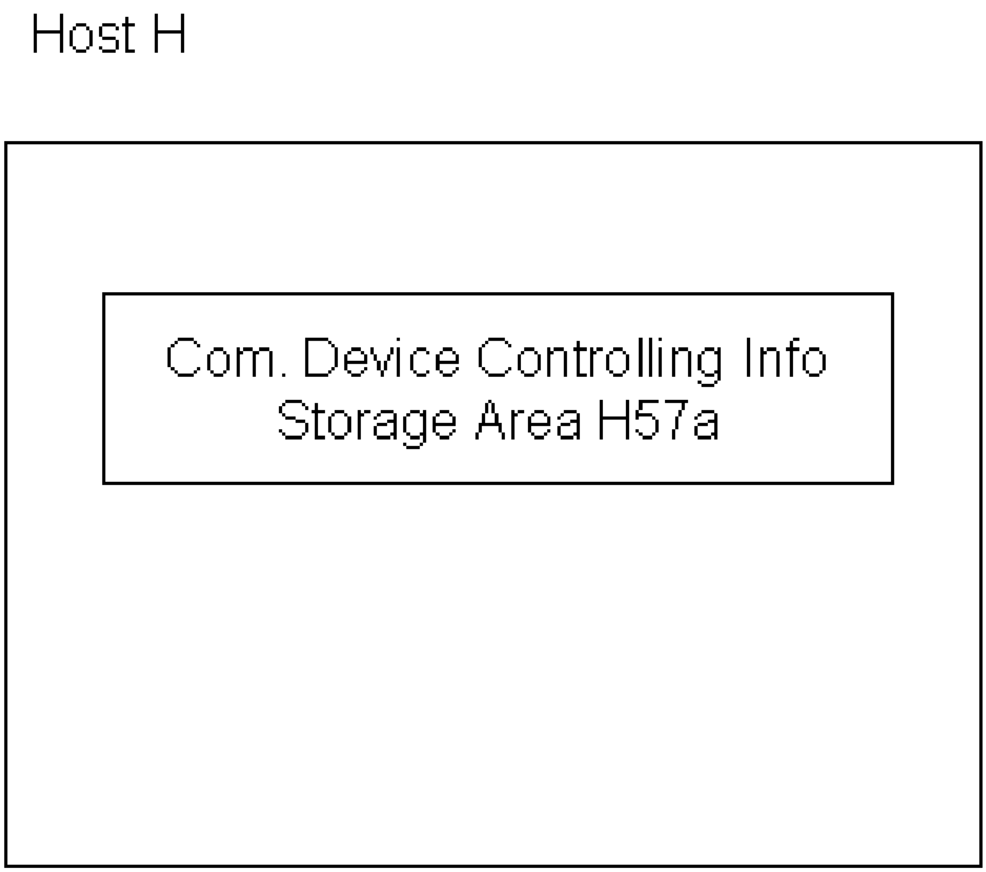

Fig. 1395
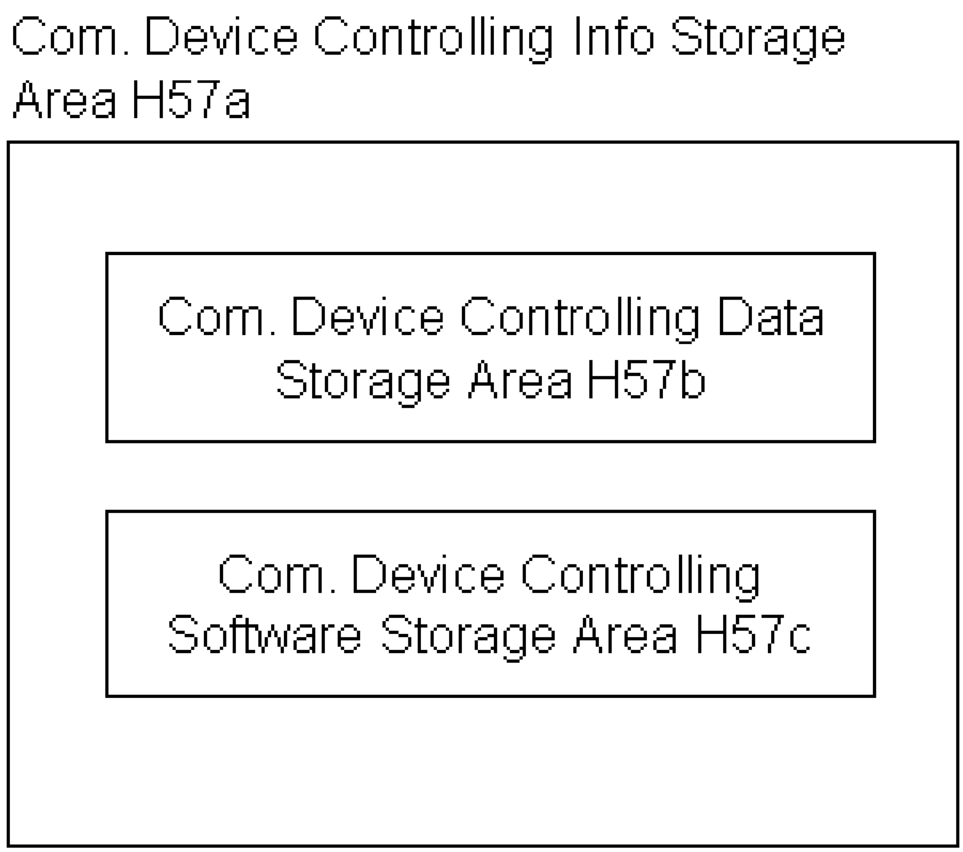

Fig. 1396
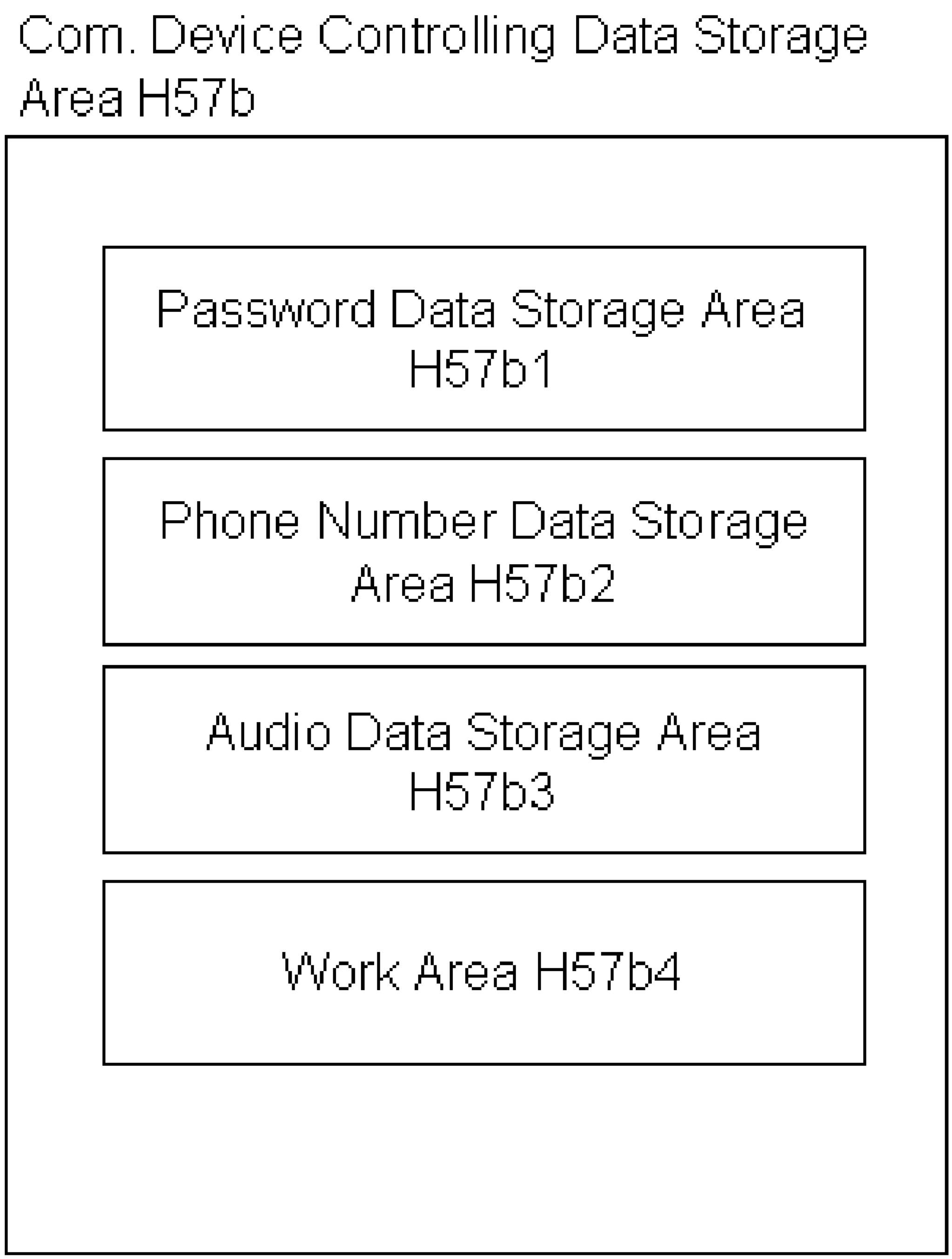

Fig. 1397

Password Data Storage Area H57b1

| User ID | Password Data |
|---|---|
| User#1 | Password Data#1 |
| User#2 | Password Data#2 |
| User#3 | Password Data#3 |
| User#4 | Password Data#4 |
| User#5 | Password Data#5 |

Fig. 1398

Phone Number Data Storage Area H57b2

| User ID | Phone Number Data |
|---|---|
| User#1 | Phone Number Data#1 |
| User#2 | Phone Number Data#2 |
| User#3 | Phone Number Data#3 |
| User#4 | Phone Number Data#4 |
| User#5 | Phone Number Data#5 |

Fig. 1399

Audio Data Storage Area H57b3

| Audio ID | Audio Data |
|---|---|
| Audio#0 | Audio Data#0 |
| Audio#1 | Audio Data#1 |
| Audio#2 | Audio Data#2 |
| Audio#3 | Audio Data#3 |
| Audio#4 | Audio Data#4 |
| Audio#5 | Audio Data#5 |
| Audio#6 | Audio Data#6 |

Fig. 1400

Com. Device Controlling Software Storage Area H57c

User Authenticating Software H57c1

Menu Introducing Software H57c2

Line Connecting Software H57c3

Manner Mode Deactivating Software H57c4

Manner Mode Deactivating & Ringing Software H57c5

Ringing Software H57c6

Password Changing Software H57c7

Device Locking Software H57c8

Power Off Software H57c9

Fig. 1401
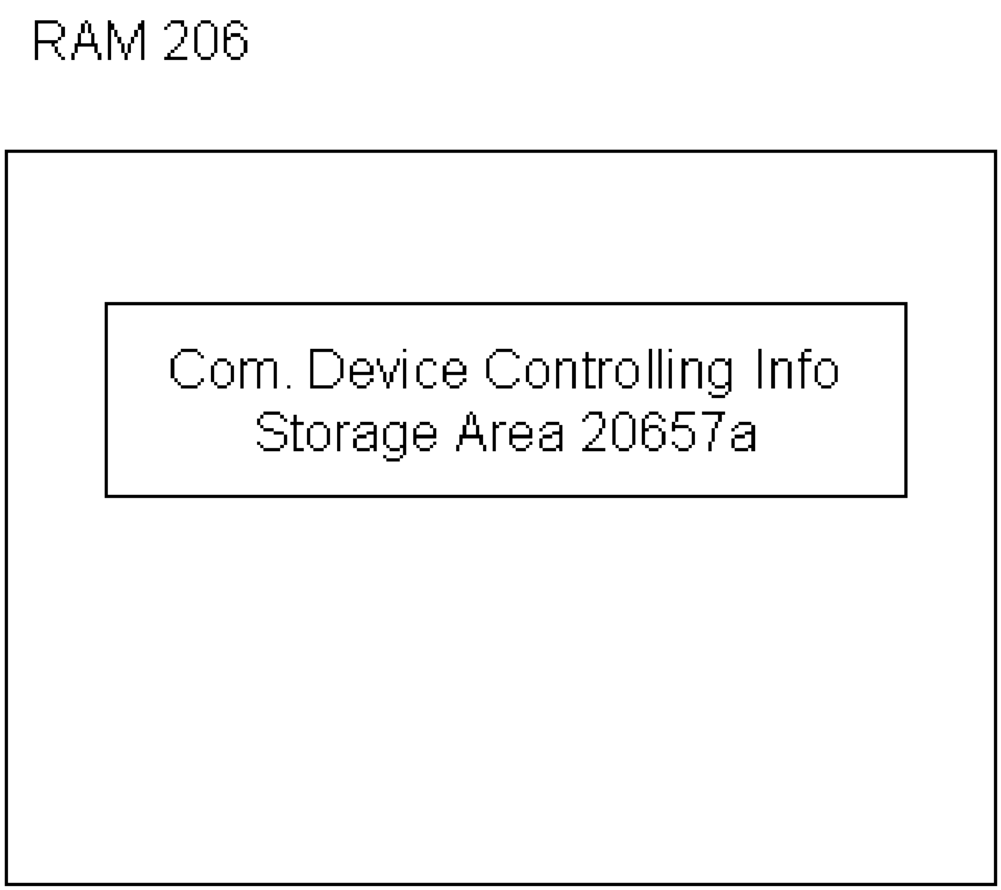

Fig. 1402
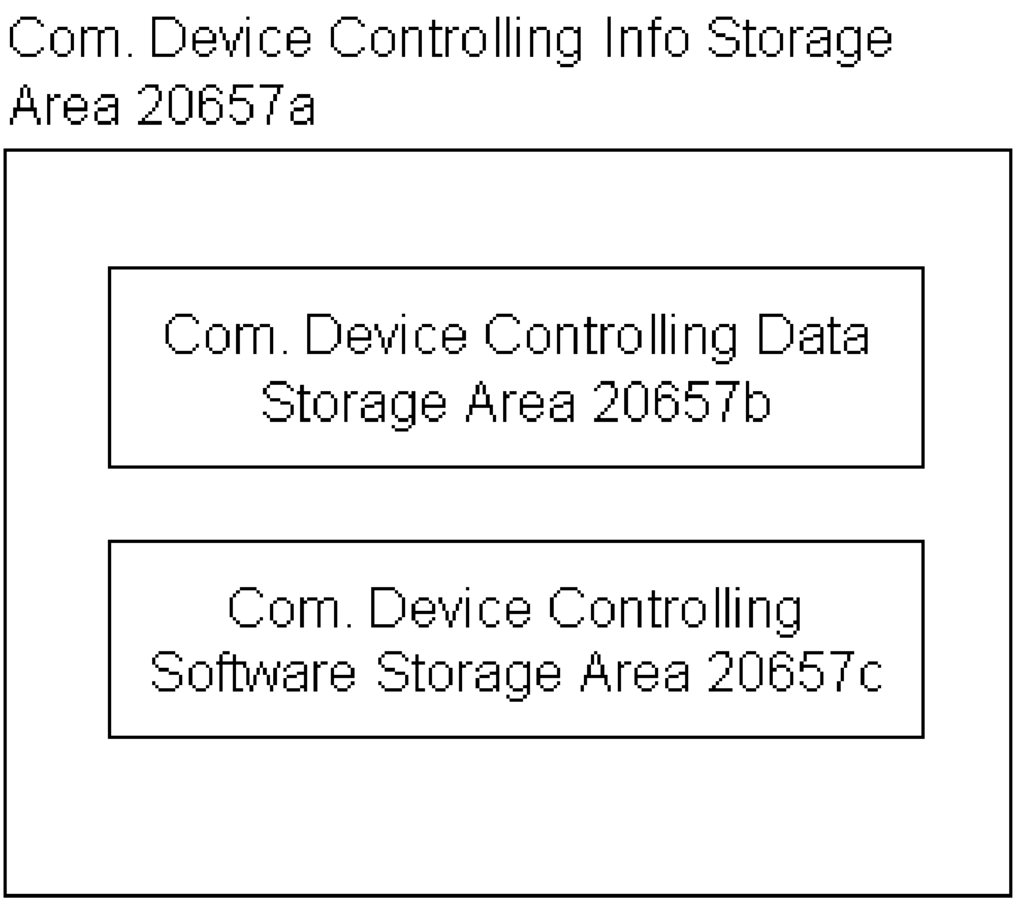

Fig. 1403
Com. Device Controlling Data Storage Area 20657b
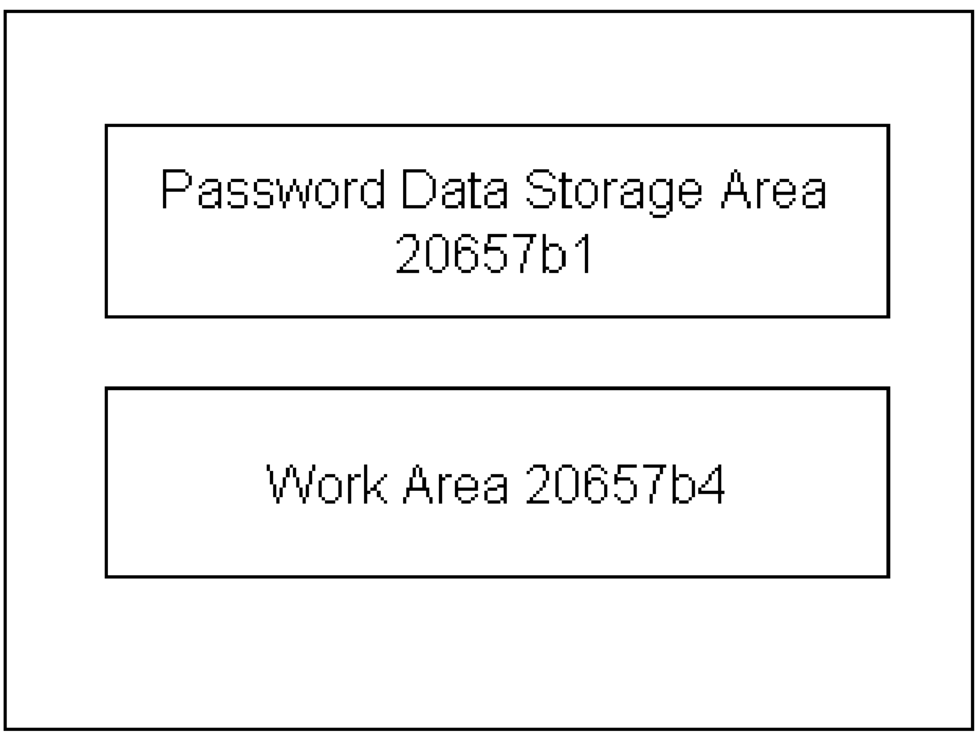

Fig. 1404

Password Data Storage Area 20657b1

| User ID | Password Data |
|---|---|
| User#1 | Password Data#1 |

Fig. 1405

Phone Number Data Storage Area
20657b2

| User ID | Phone Number Data |
|---|---|
| User#1 | Phone Number Data#1 |

Fig. 1406

Com. Device Controlling Software Storage Area 20657c

Line Connecting Software 20657c3

Manner Mode Deactivating Software 20657c4

Manner Mode Deactivating & Ringing Software 20657c5

Ringing Software 20657c6

Password Changing Software 20657c7

Device Locking Software 20657c8

Power Off Software 20657c9

Fig. 1407
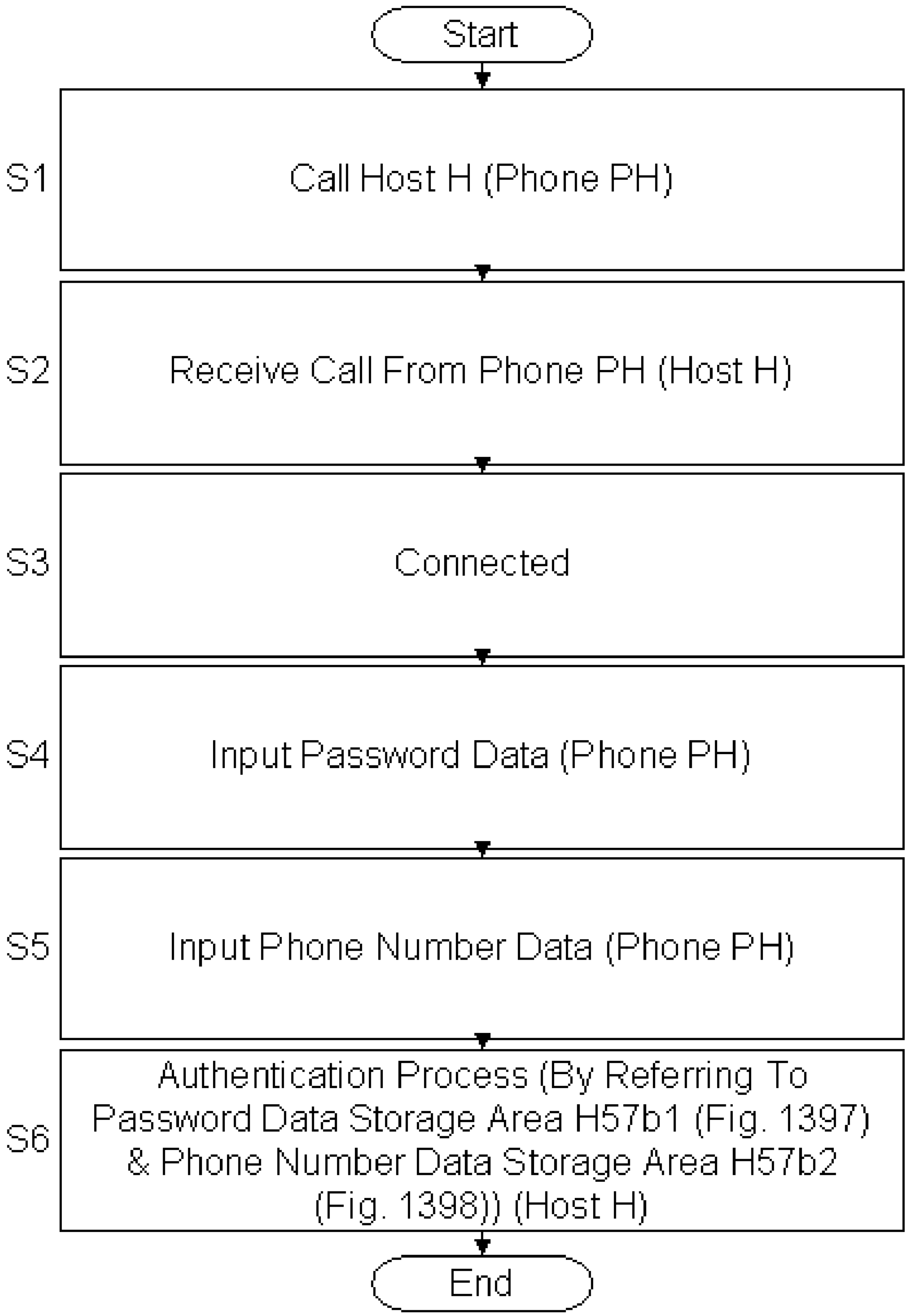

Fig. 1408
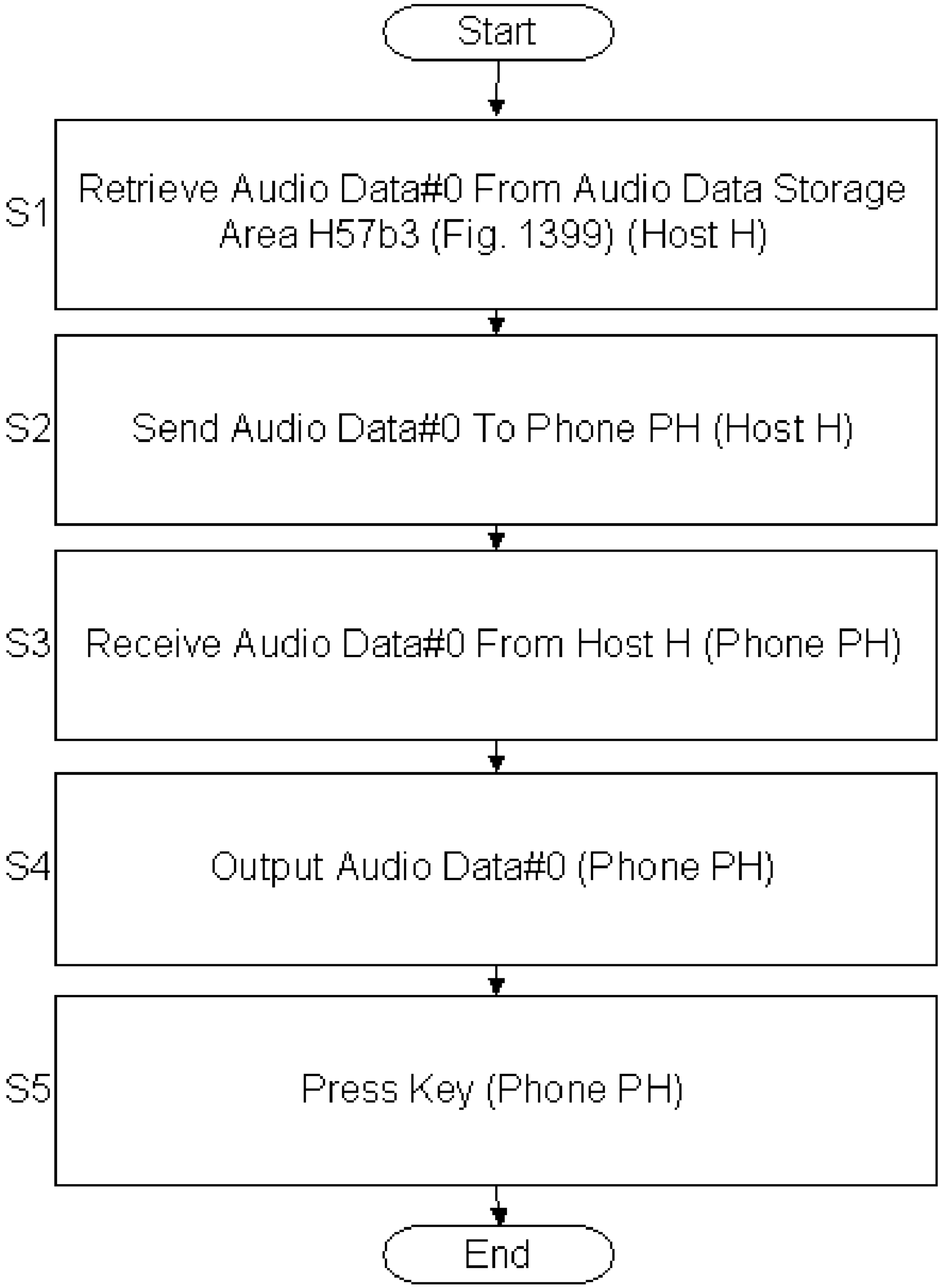

Fig. 1409
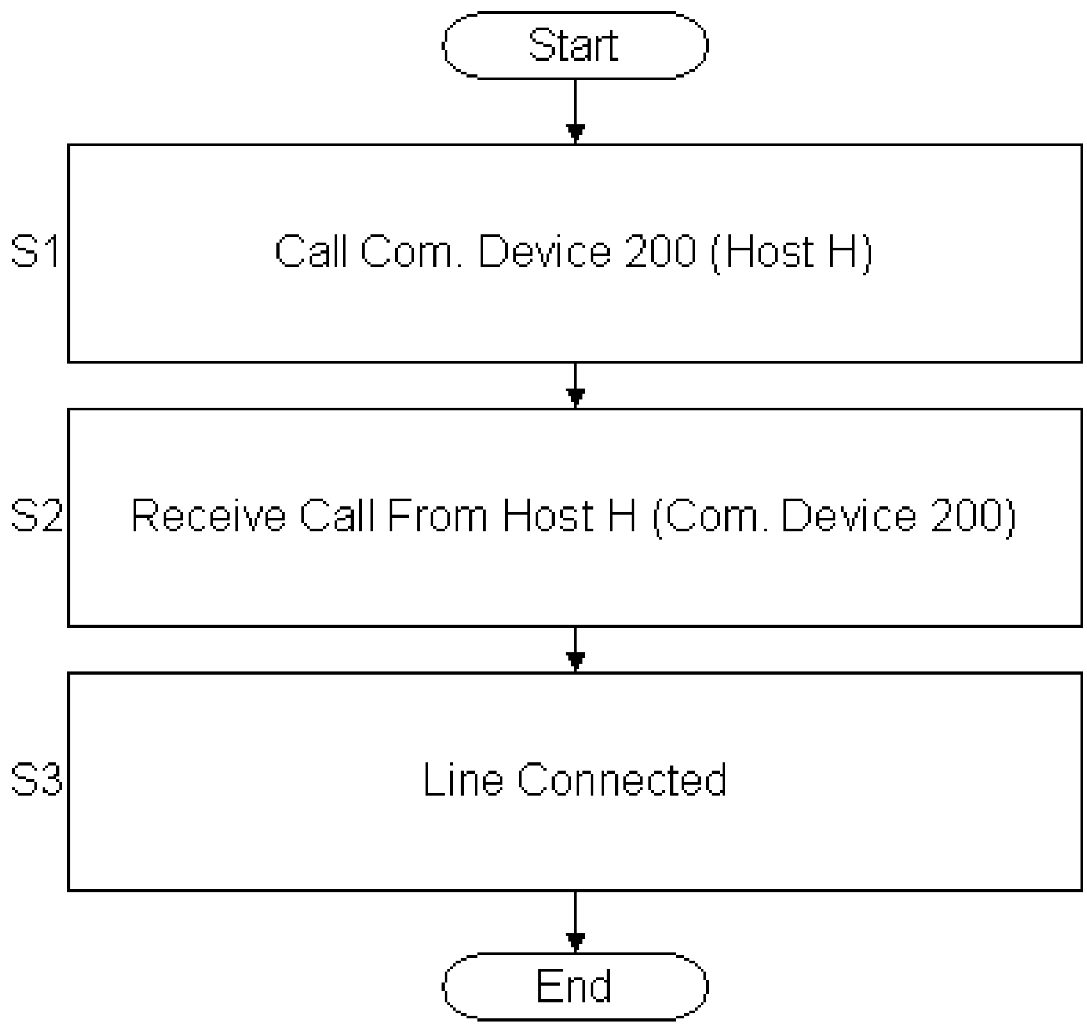

Fig. 1410
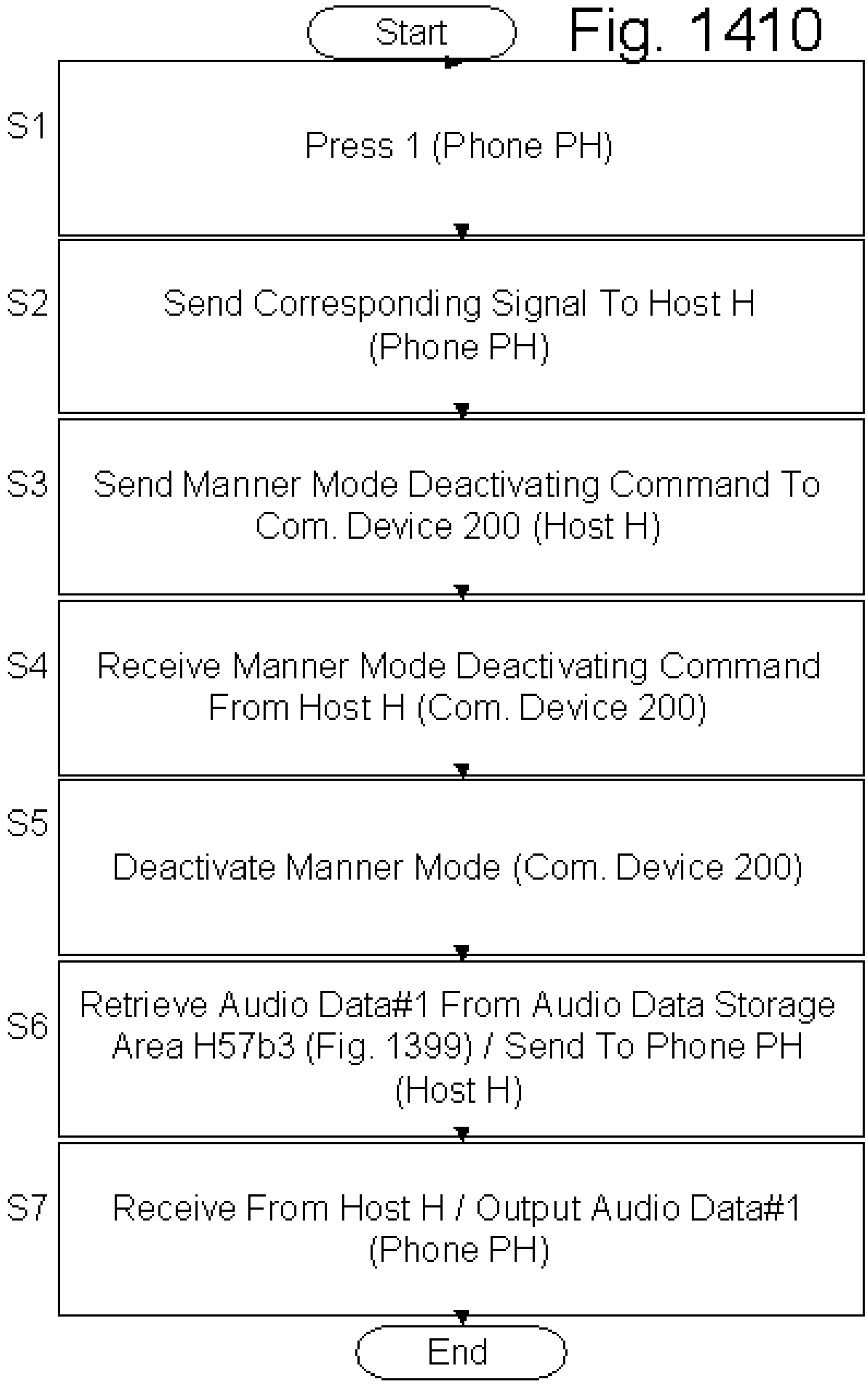

Fig. 1411
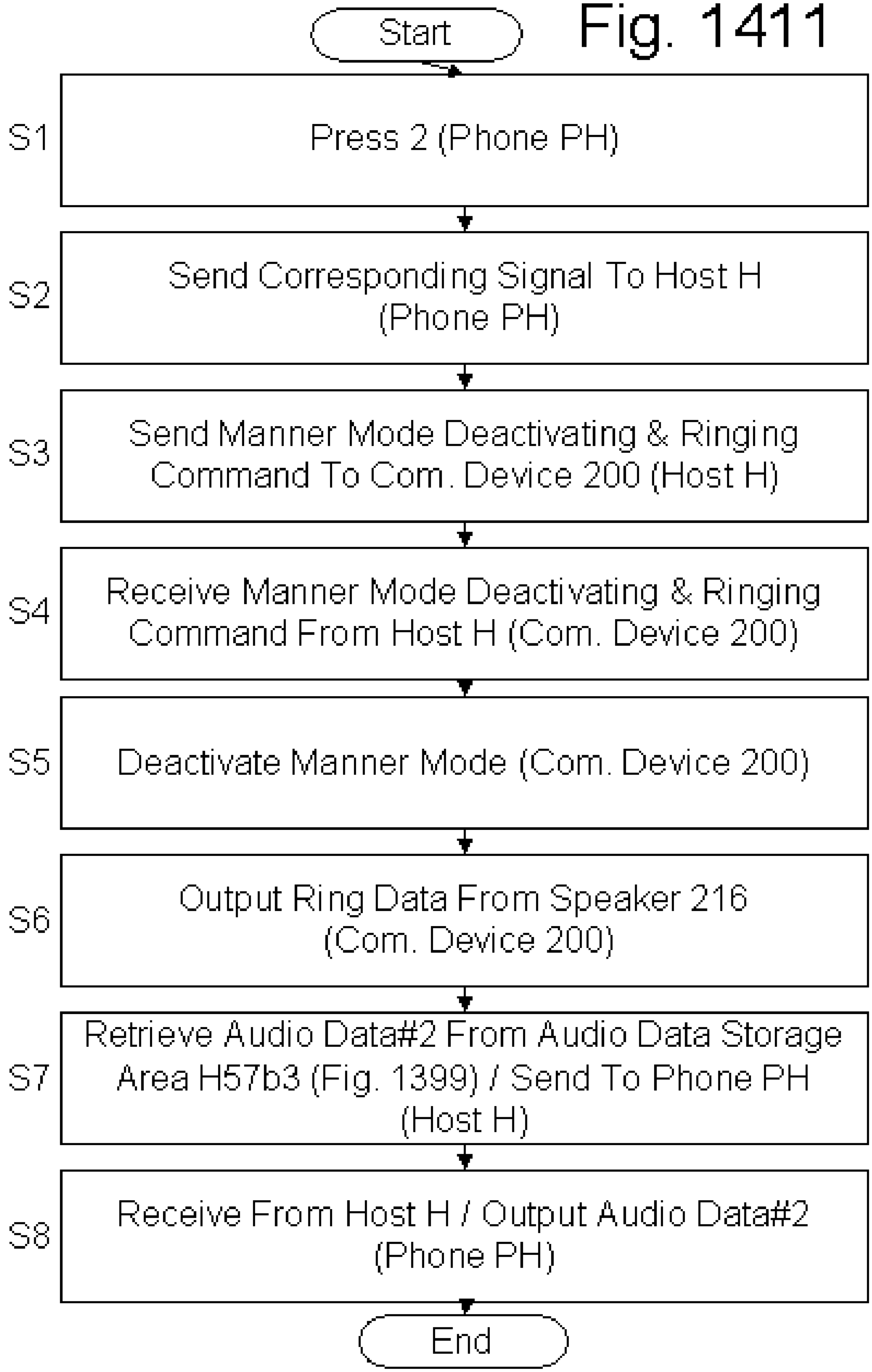

Fig. 1412
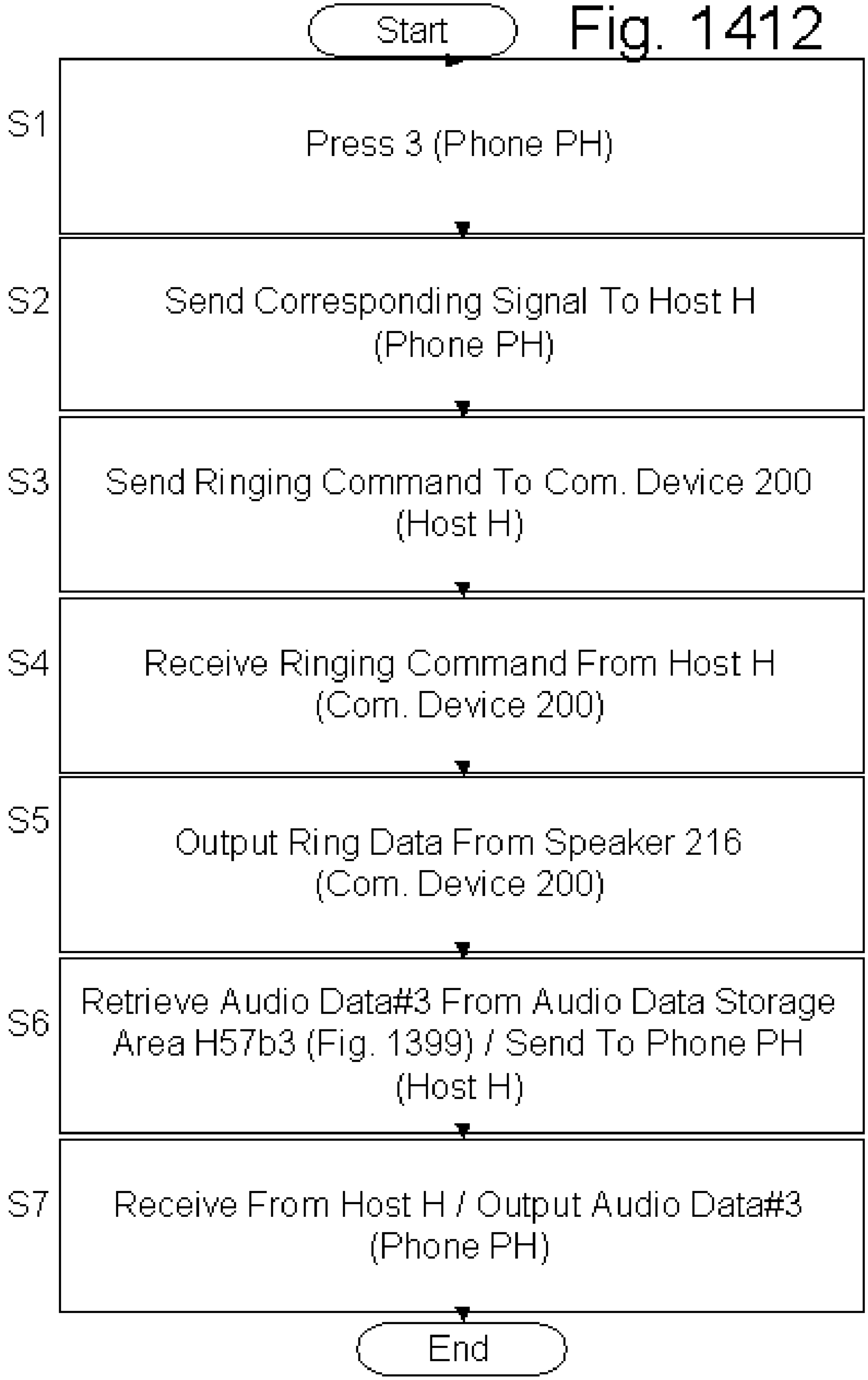

Fig. 1413
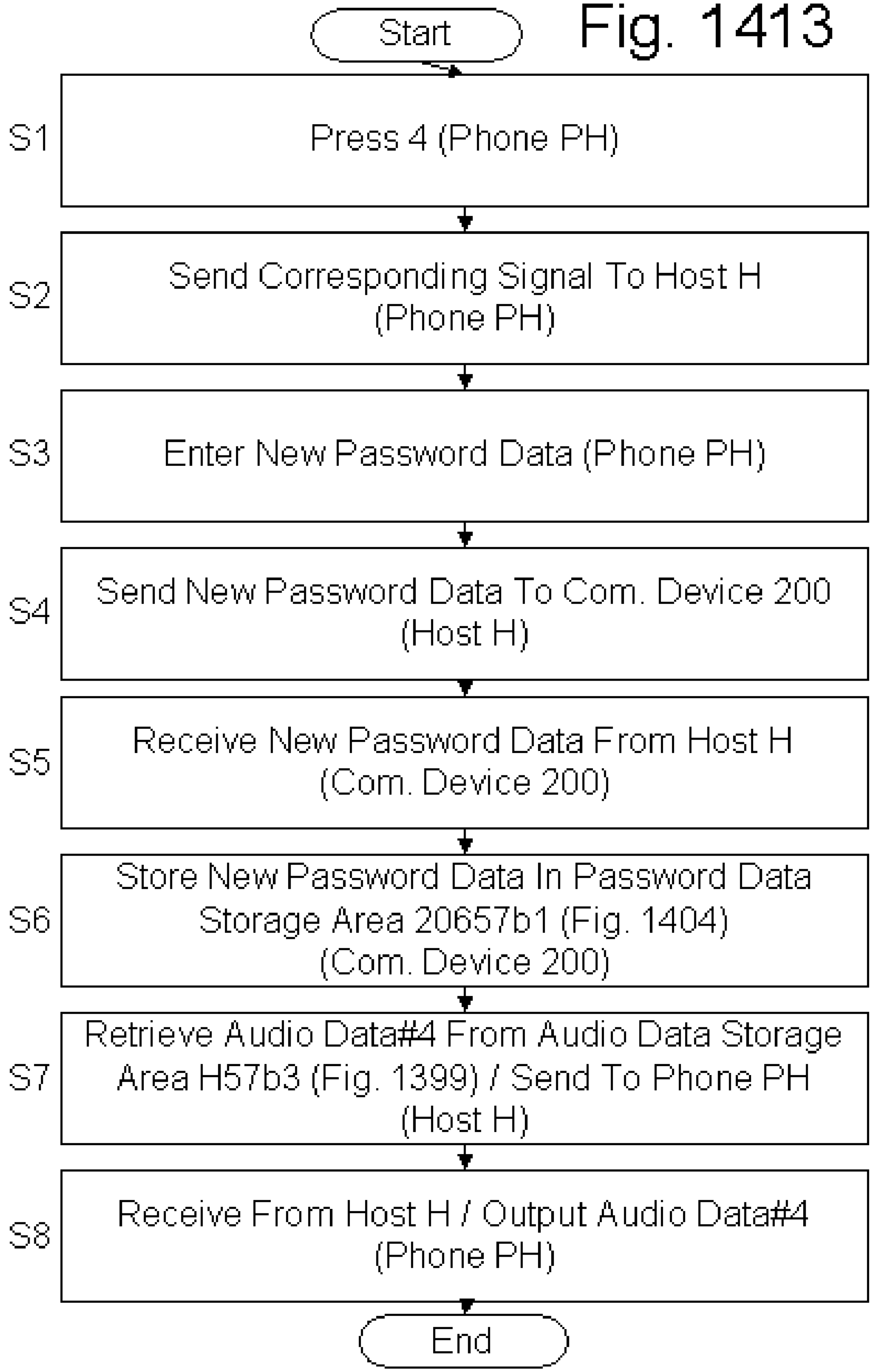

Fig. 1414
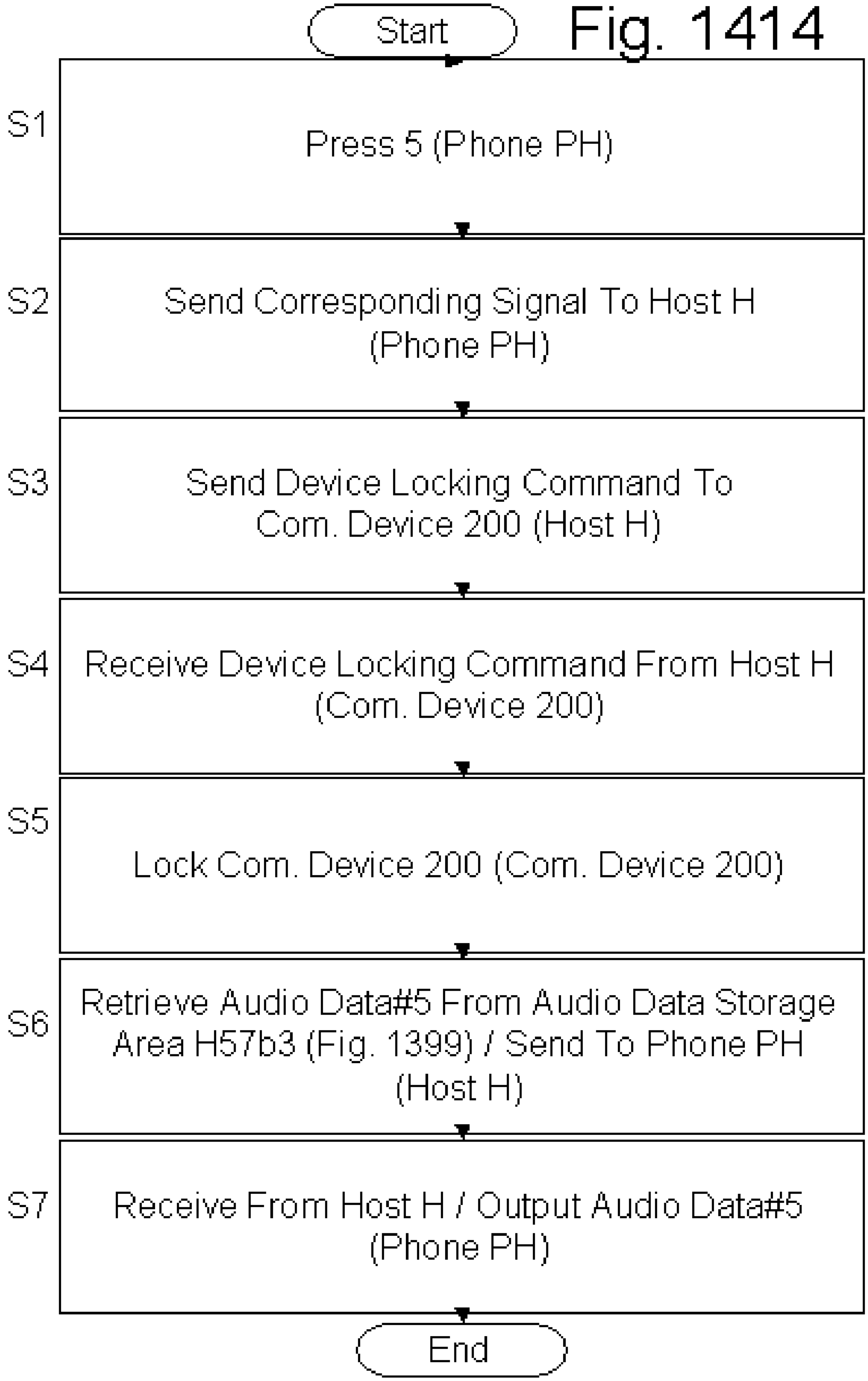

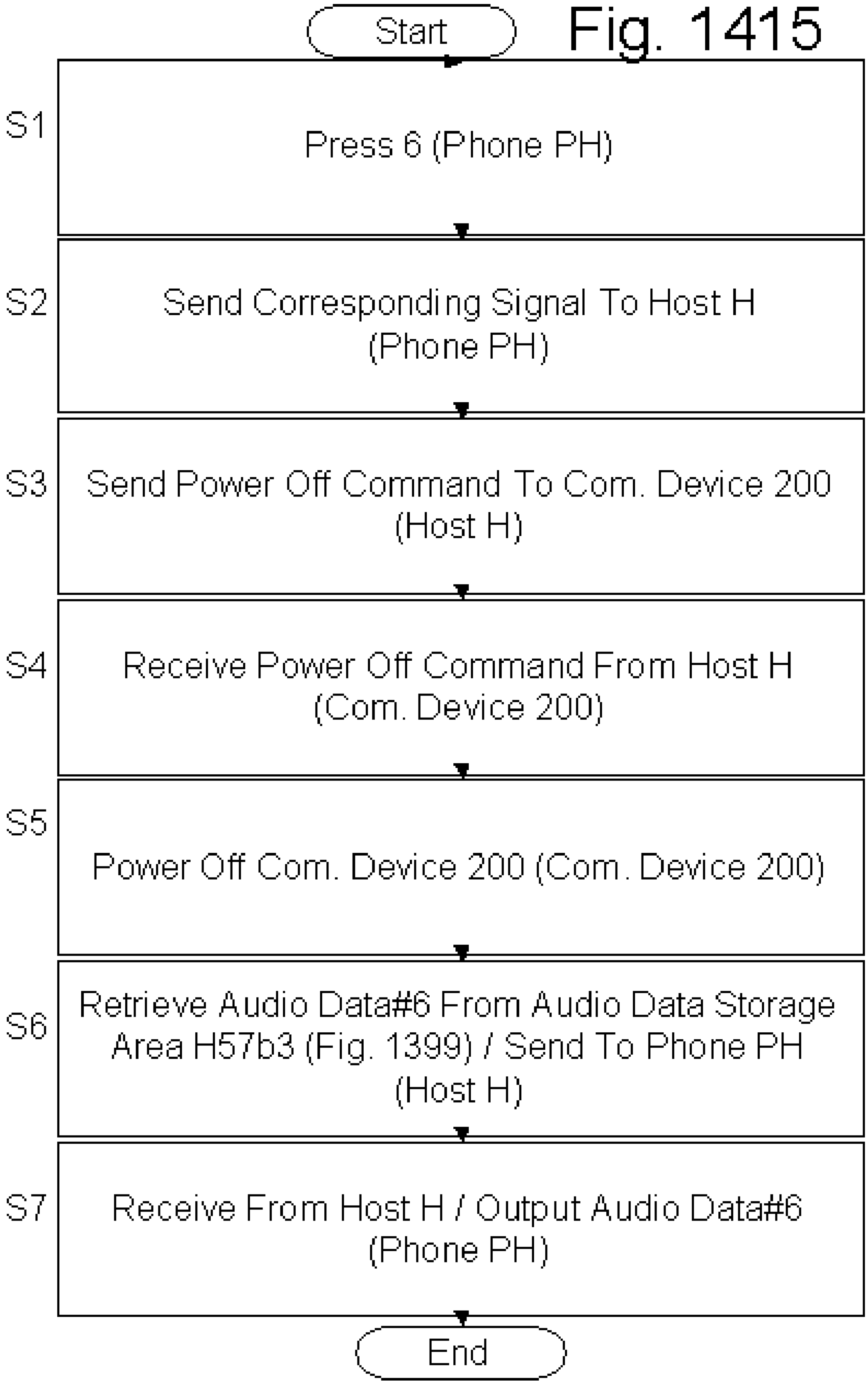
Start
Fig. 1415
S1
Press 6 (Phone PH)
S2
Send Corresponding Signal To Host H (Phone PH)
S3
Send Power Off Command To Com. Device 200 (Host H)
S4
Receive Power Off Command From Host H (Com. Device 200)
S5
Power Off Com. Device 200 (Com. Device 200)
S6
Retrieve Audio Data#6 From Audio Data Storage Area H57b3 (Fig. 1399) / Send To Phone PH (Host H)
S7
Receive From Host H / Output Audio Data#6 (Phone PH)
End Fig. 1416
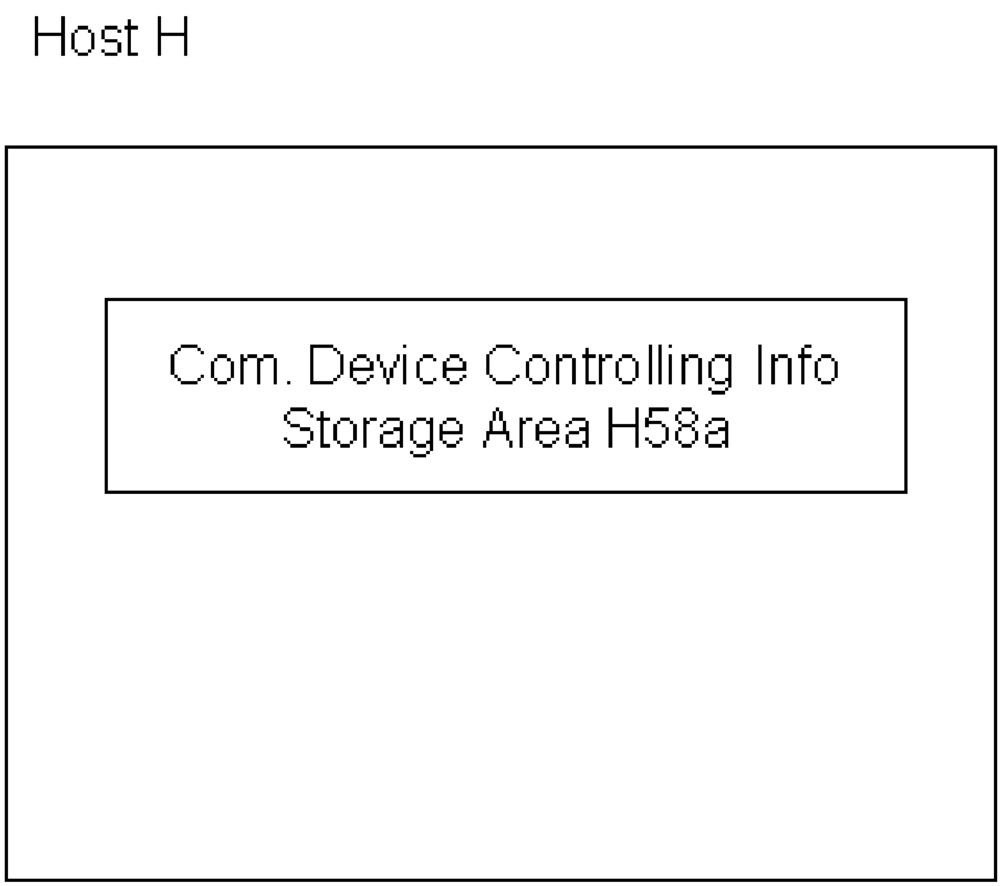

Fig. 1417
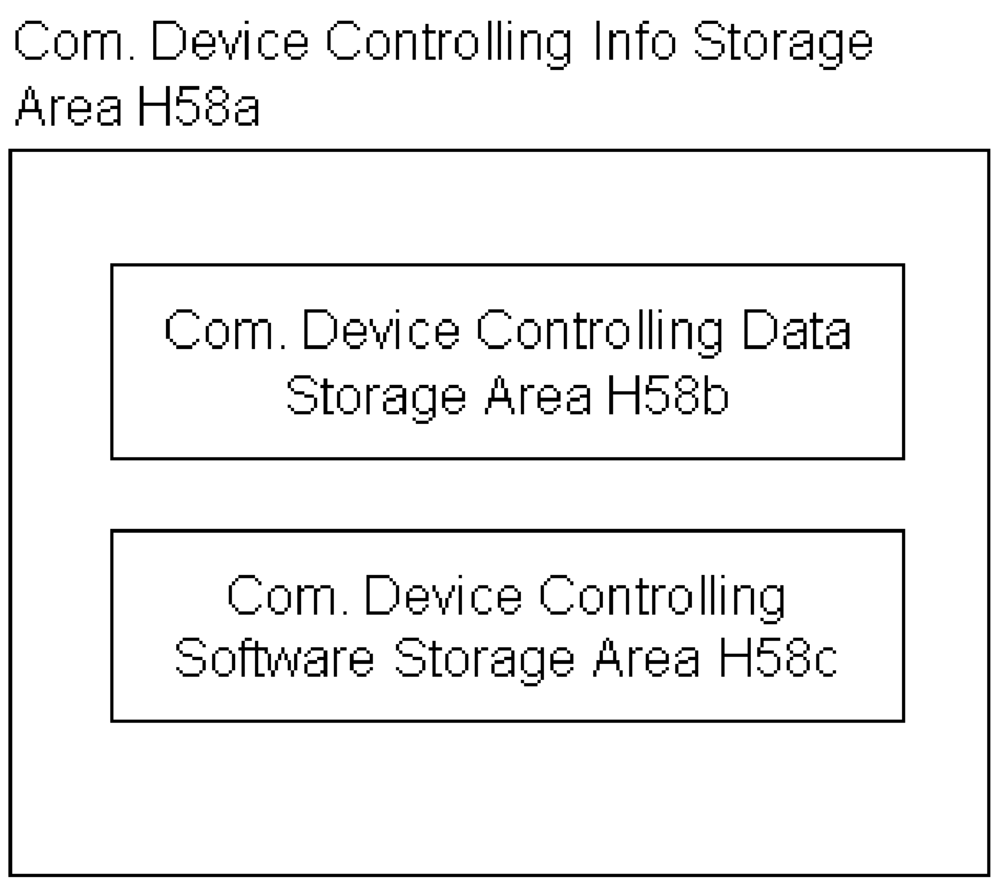

Fig. 1418
Com. Device Controlling Data Storage Area H58b
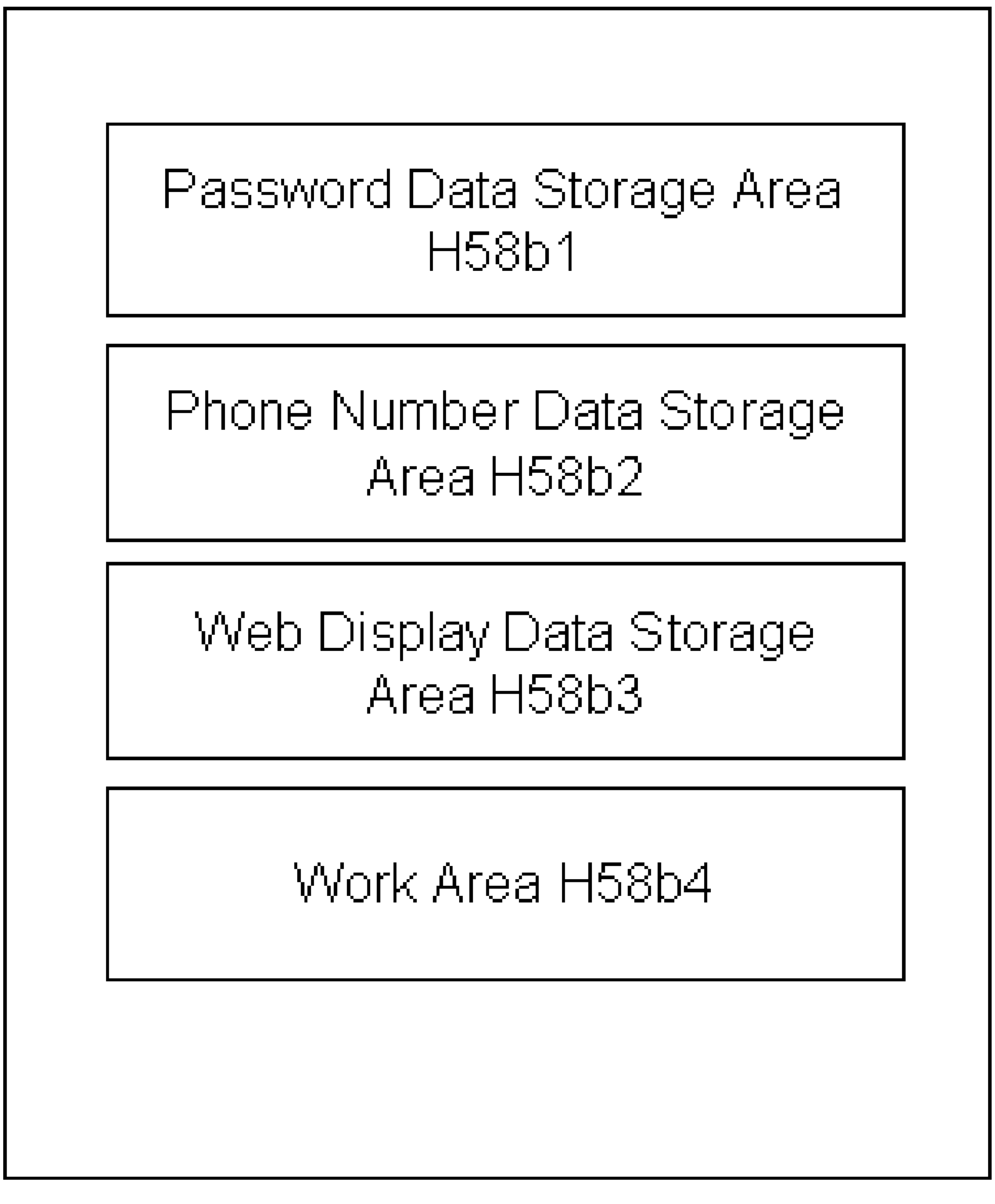

Fig. 1419

Password Data Storage Area H58b1

| User ID | Password Data |
|---|---|
| User#1 | Password Data#1 |
| User#2 | Password Data#2 |
| User#3 | Password Data#3 |
| User#4 | Password Data#4 |
| User#5 | Password Data#5 |

Fig. 1420

Phone Number Data Storage Area H58b2

| User ID | Phone Number Data |
|---|---|
| User#1 | Phone Number Data#1 |
| User#2 | Phone Number Data#2 |
| User#3 | Phone Number Data#3 |
| User#4 | Phone Number Data#4 |
| User#5 | Phone Number Data#5 |

Fig. 1421

Web Display Data Storage Area H58b3

| Web Display ID | Web Display Data |
|---|---|
| Web Display#0 | Web Display Data#0 |
| Web Display#1 | Web Display Data#1 |
| Web Display#2 | Web Display Data#2 |
| Web Display#3 | Web Display Data#3 |
| Web Display#4 | Web Display Data#4 |
| Web Display#5 | Web Display Data#5 |
| Web Display#6 | Web Display Data#6 |

Fig. 1421a
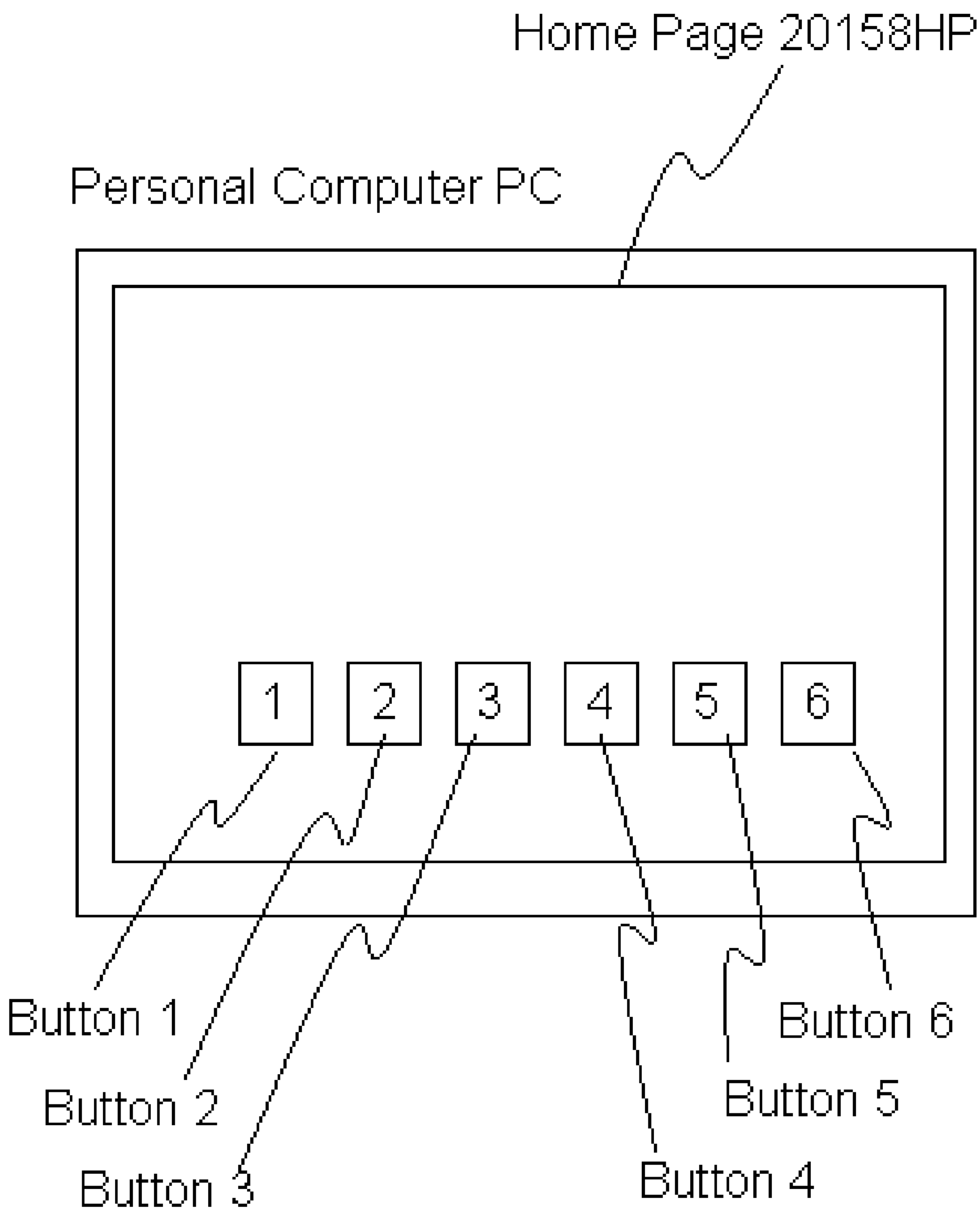

Fig. 1422

Com. Device Controlling Software Storage Area H58c

User Authenticating Software H58c1
Menu Introducing Software H58c2
Line Connecting Software H58c3
Manner Mode Deactivating Software H58c4
Manner Mode Deactivating & Ringing Software H58c5
Ringing Software H58c6
Password Changing Software H58c7
Device Locking Software H58c8
Power Off Software H58c9

Fig. 1423
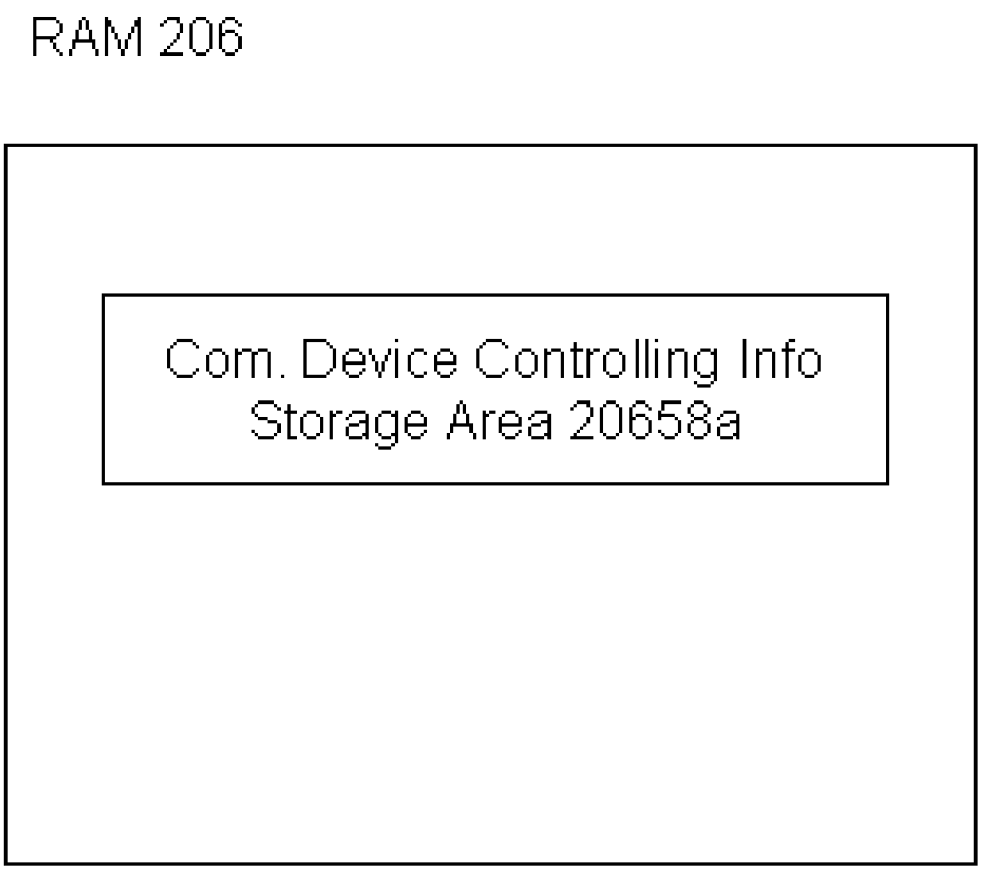

Fig. 1424
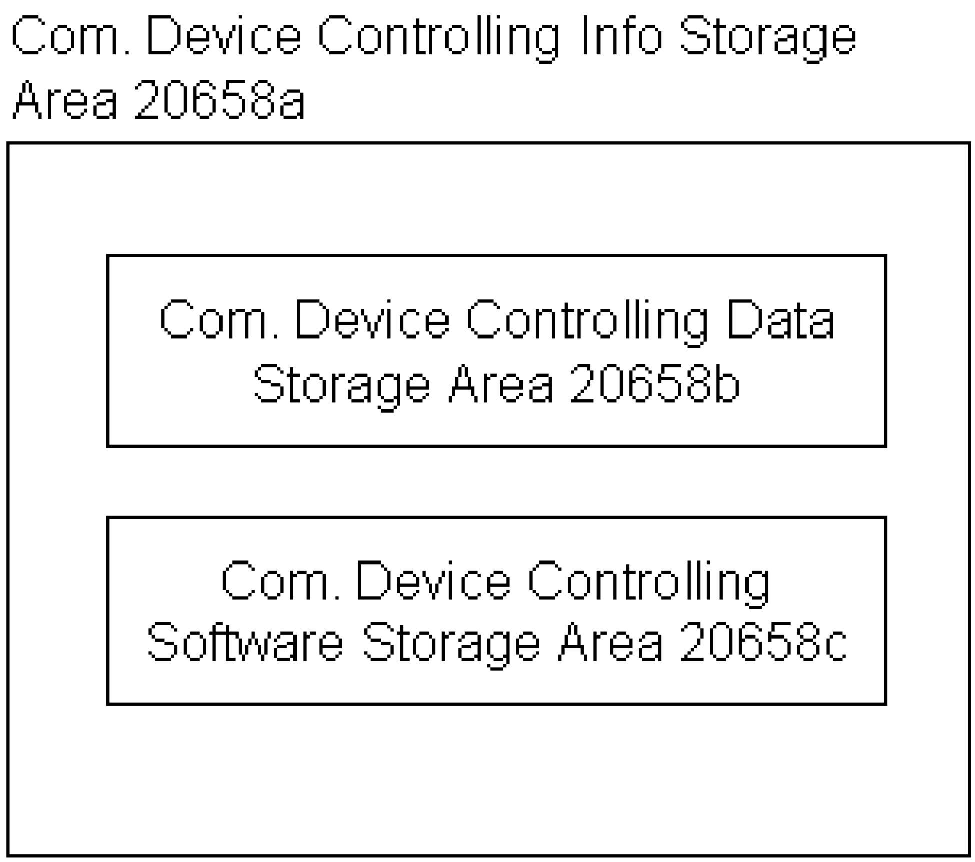

Fig. 1425
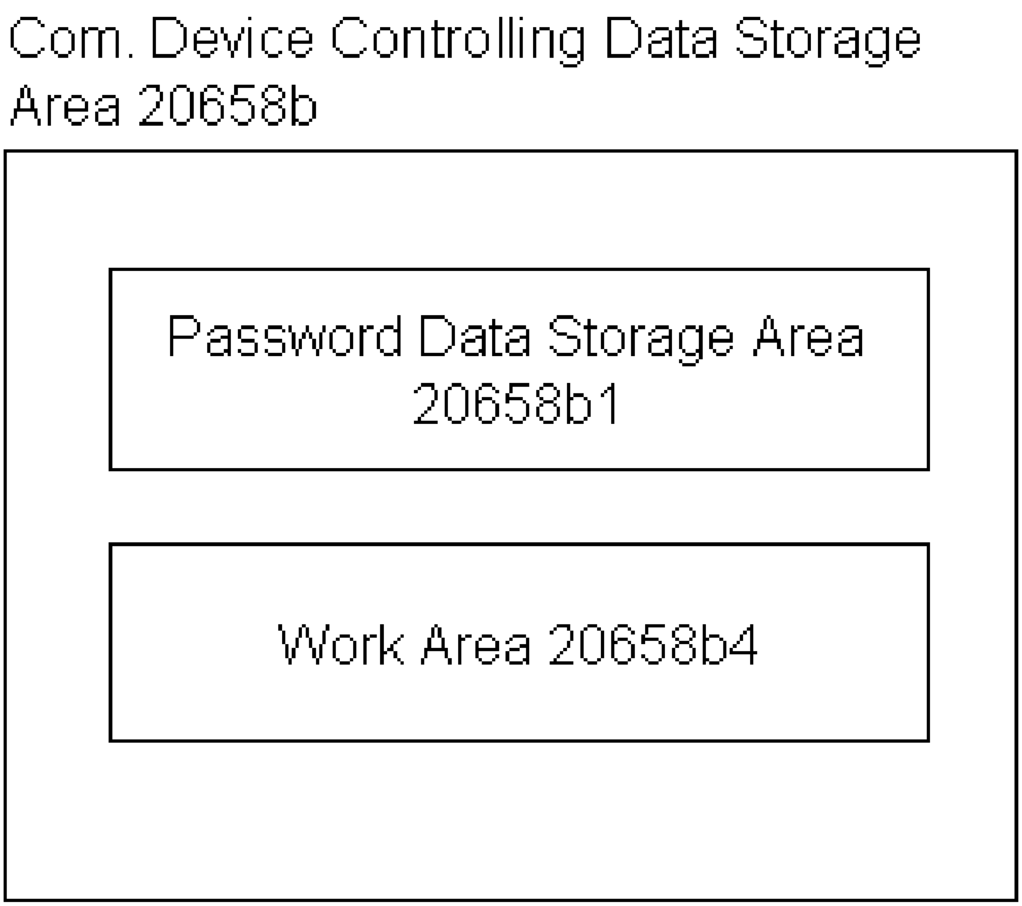

Fig. 1426

Password Data Storage Area 20658b1

| User ID | Password Data |
|---|---|
| User#1 | Password Data#1 |

Fig. 1427

Phone Number Data Storage Area
20658b2

| User ID | Phone Number Data |
|---|---|
| User#1 | Phone Number Data#1 |

Fig. 1428

Com. Device Controlling Software Storage Area 20658c

Line Connecting Software 20658c3

Manner Mode Deactivating Software 20658c4

Manner Mode Deactivating & Ringing Software 20658c5

Ringing Software 20658c6

Password Changing Software 20658c7

Device Locking Software 20658c8

Power Off Software 20658c9

Fig. 1429
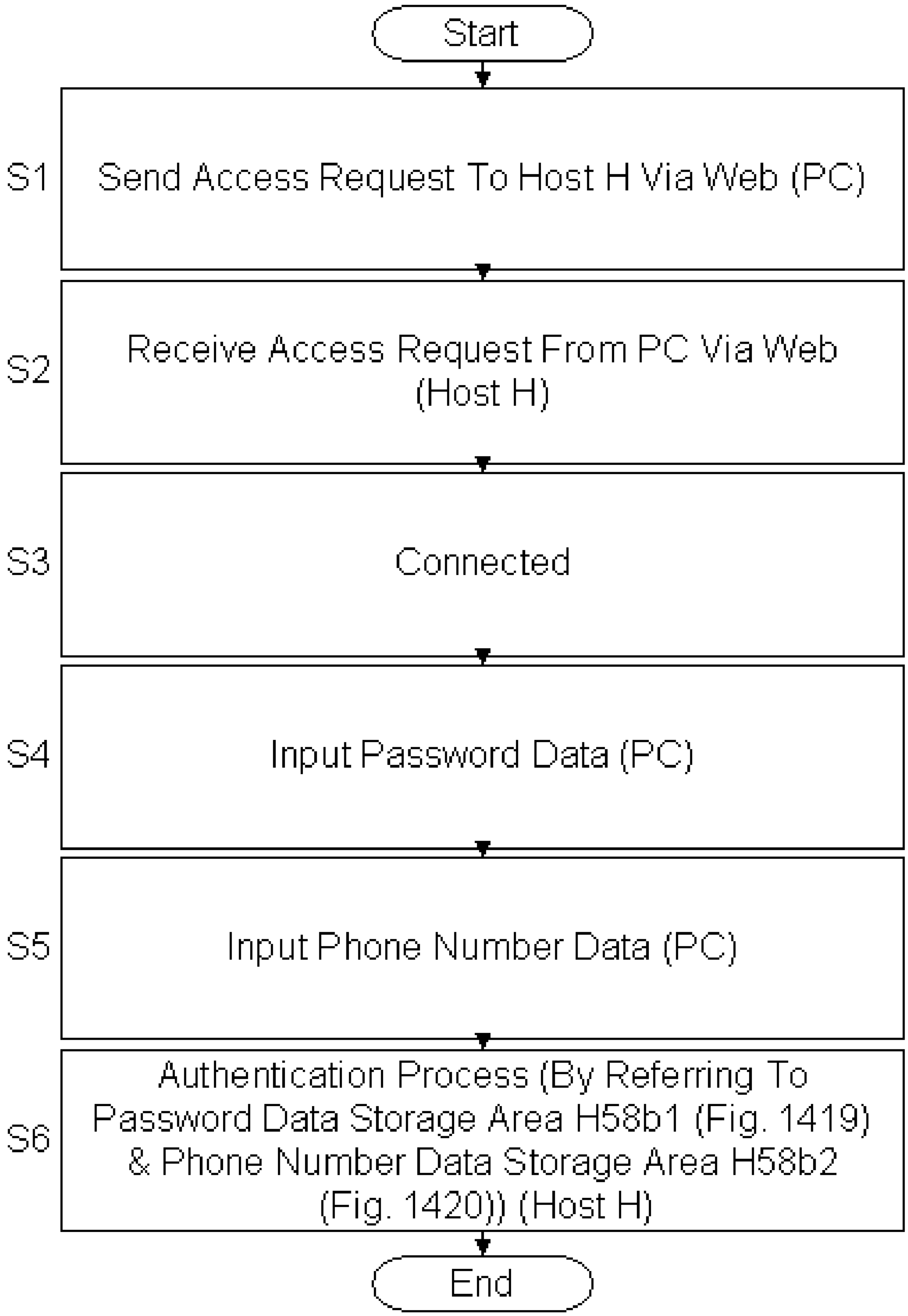

Fig. 1430
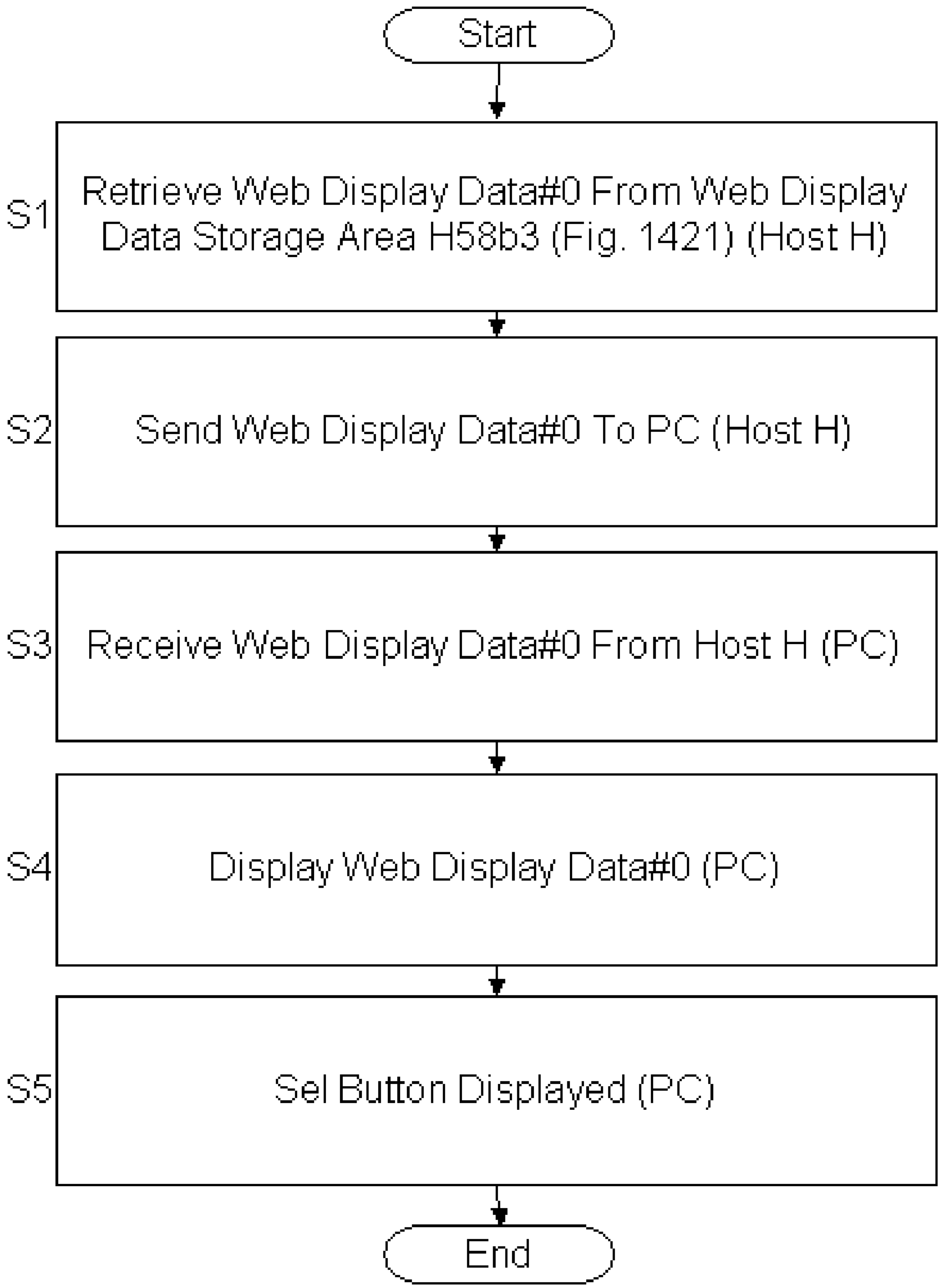

Fig. 1431
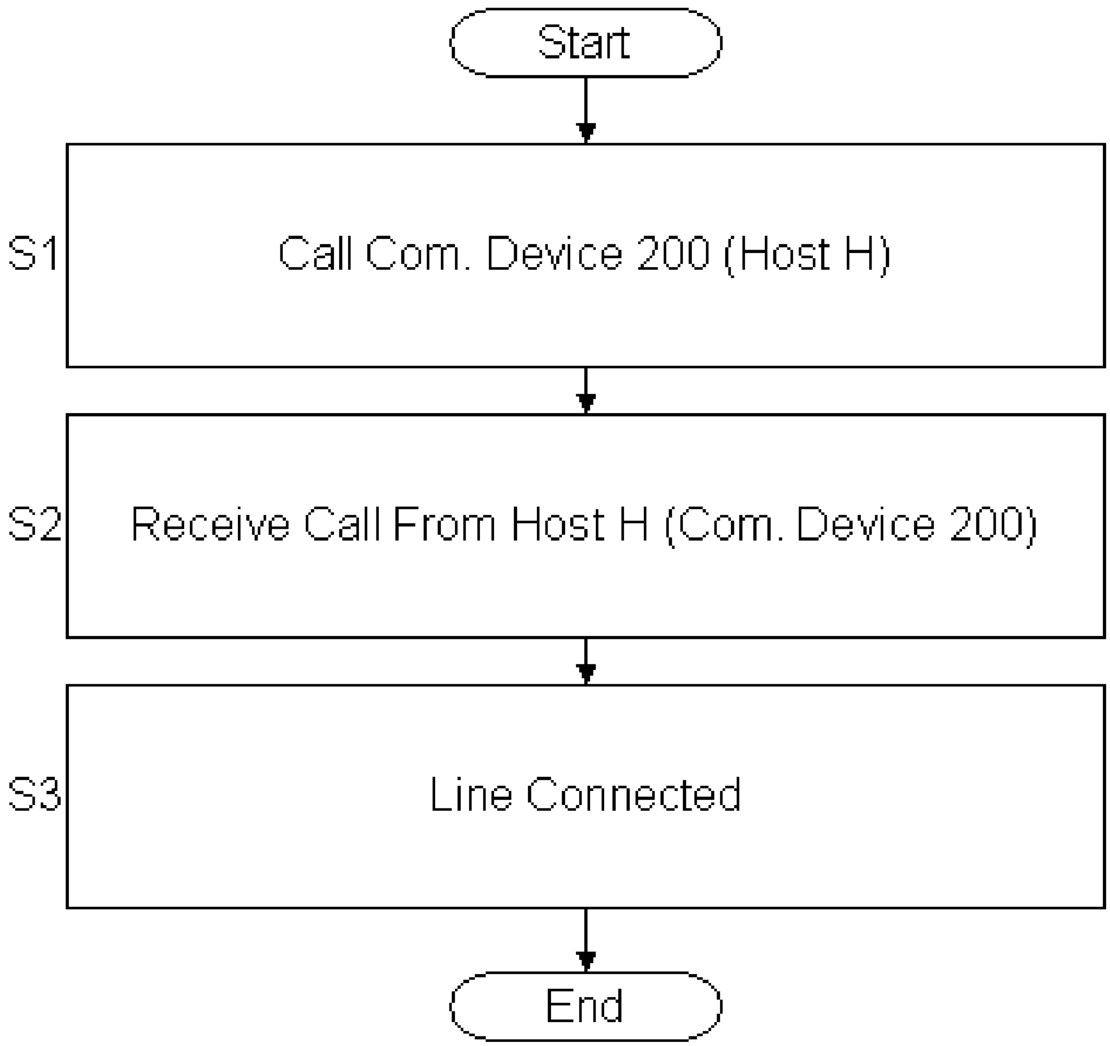

Fig. 1432
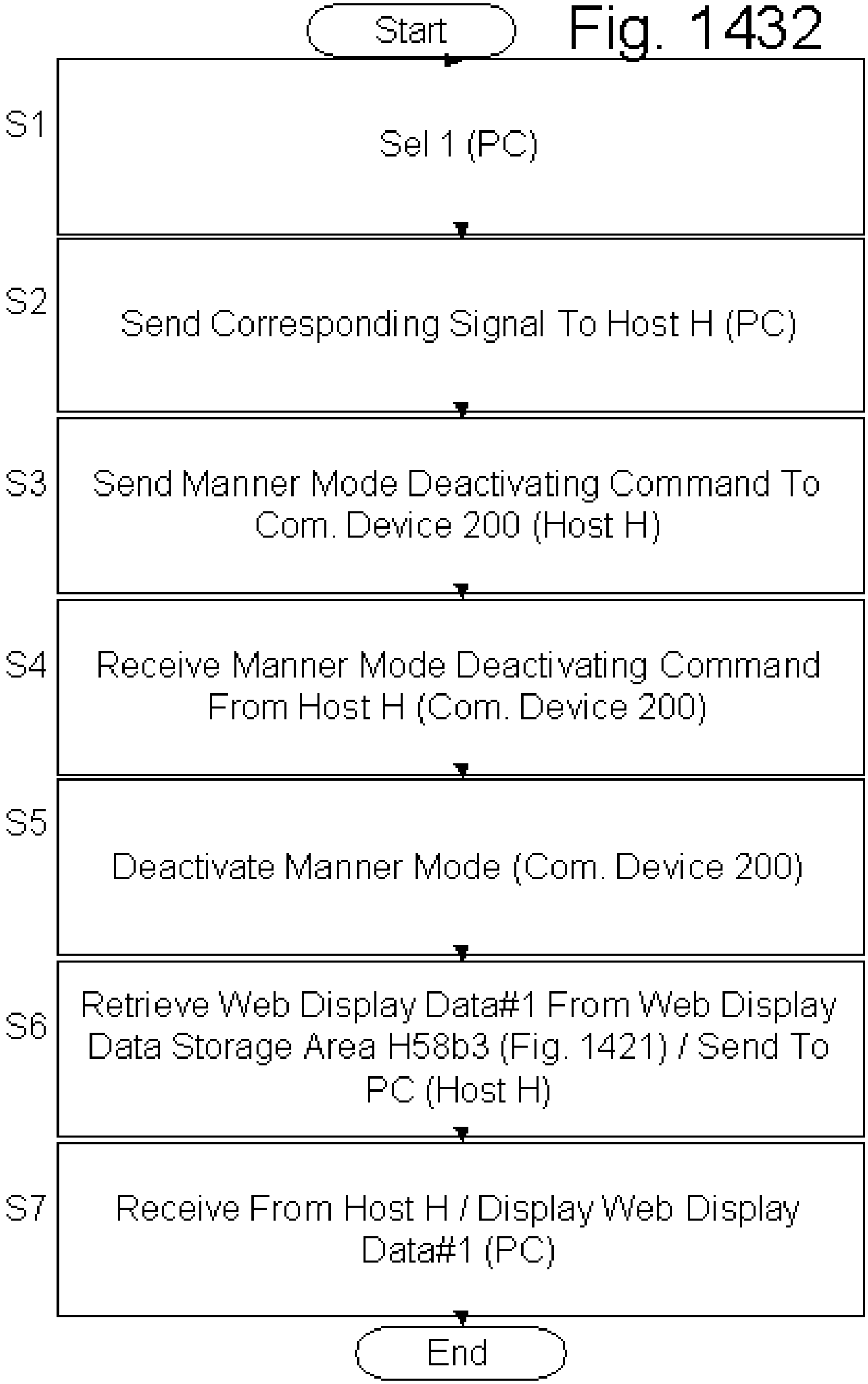

Fig. 1433
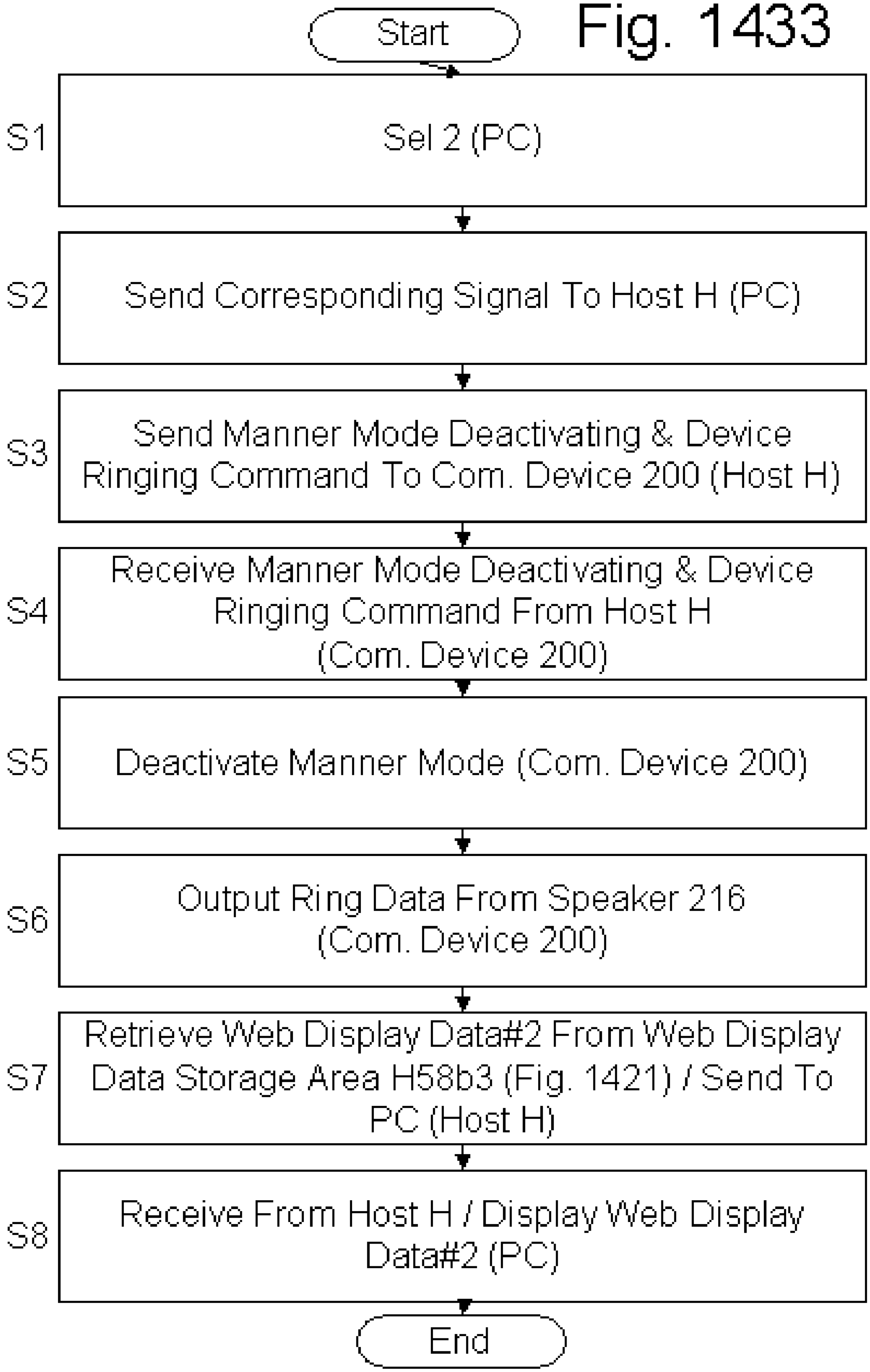

Fig. 1434
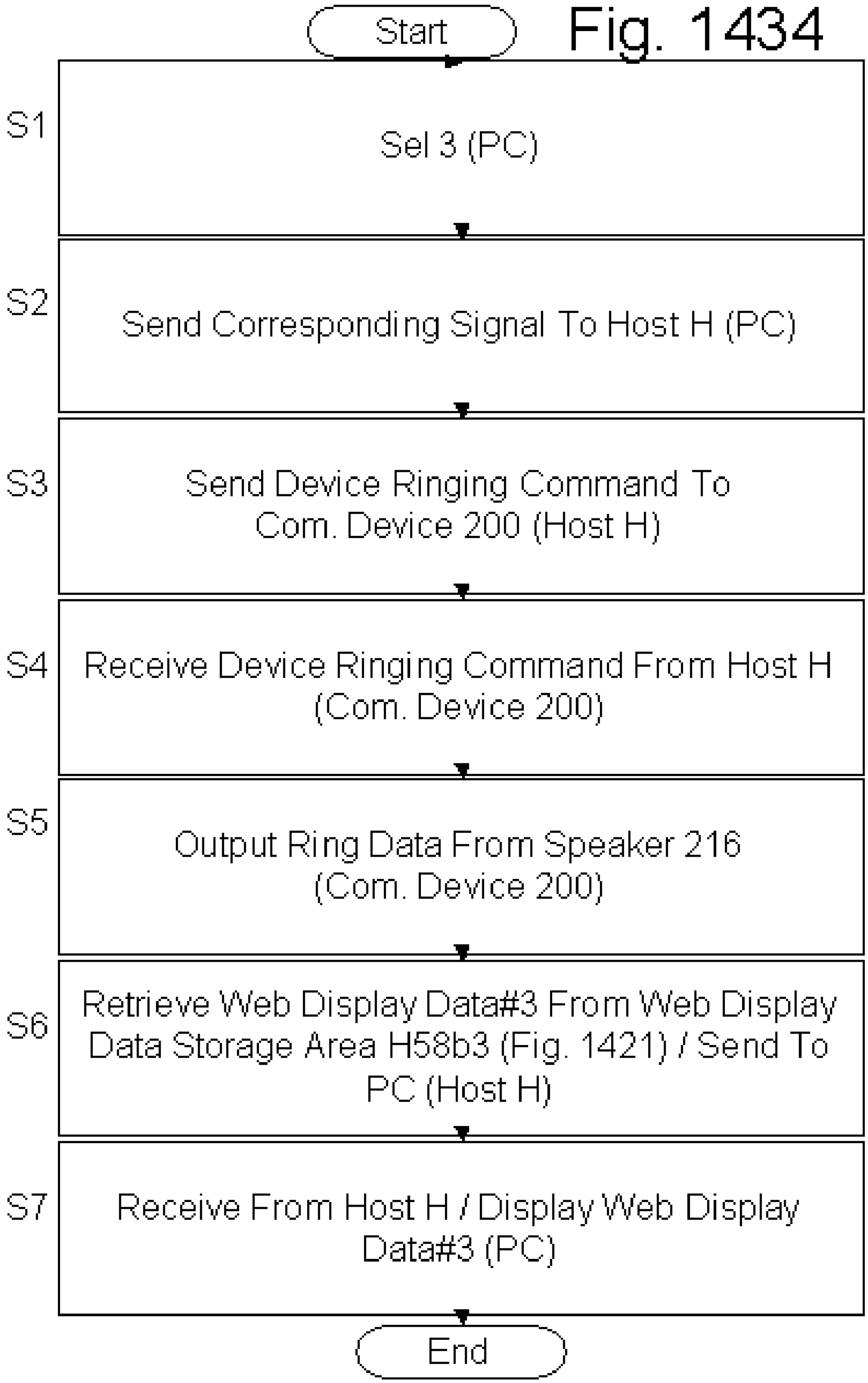

Fig. 1435
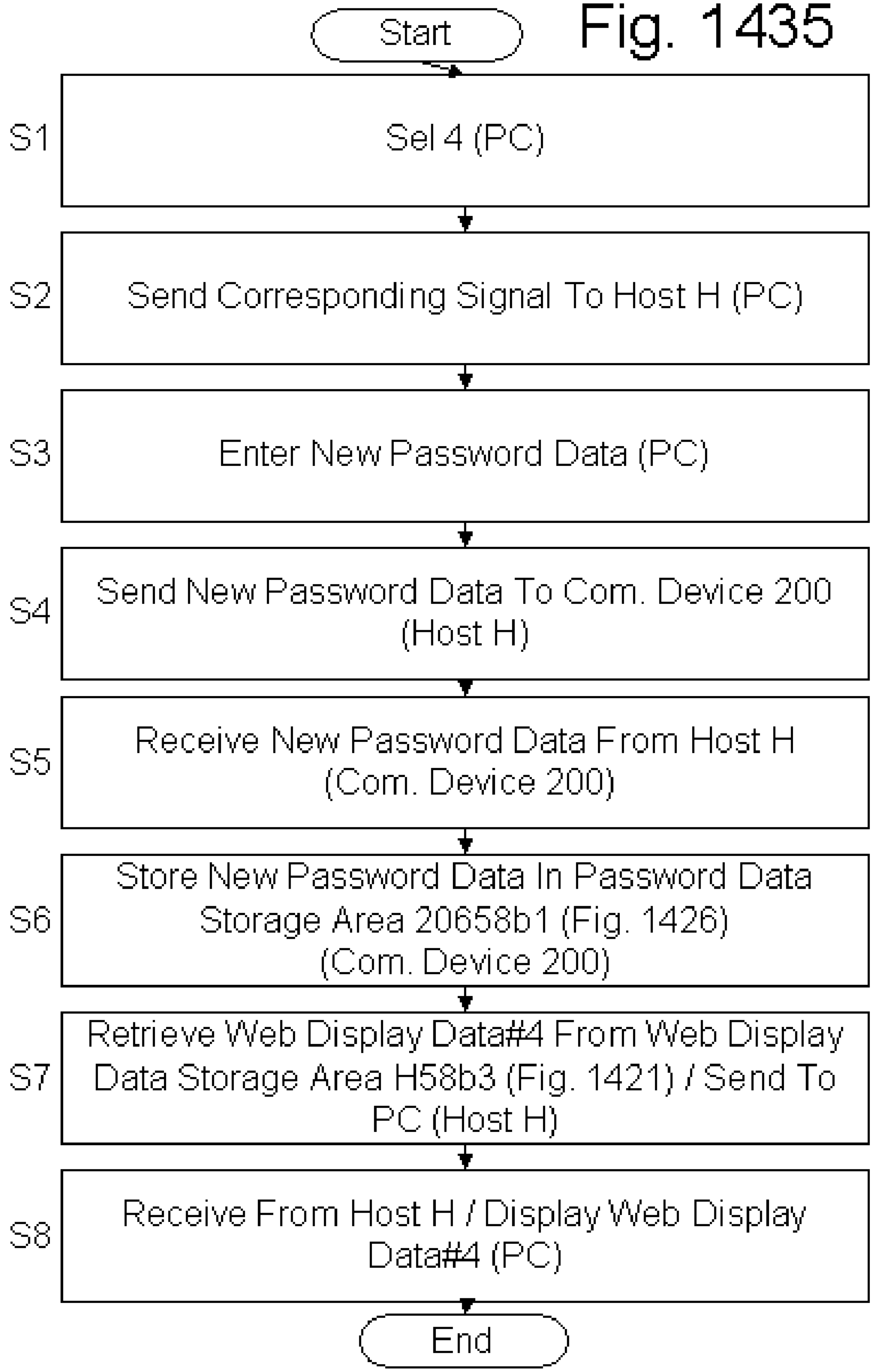

Fig. 1436
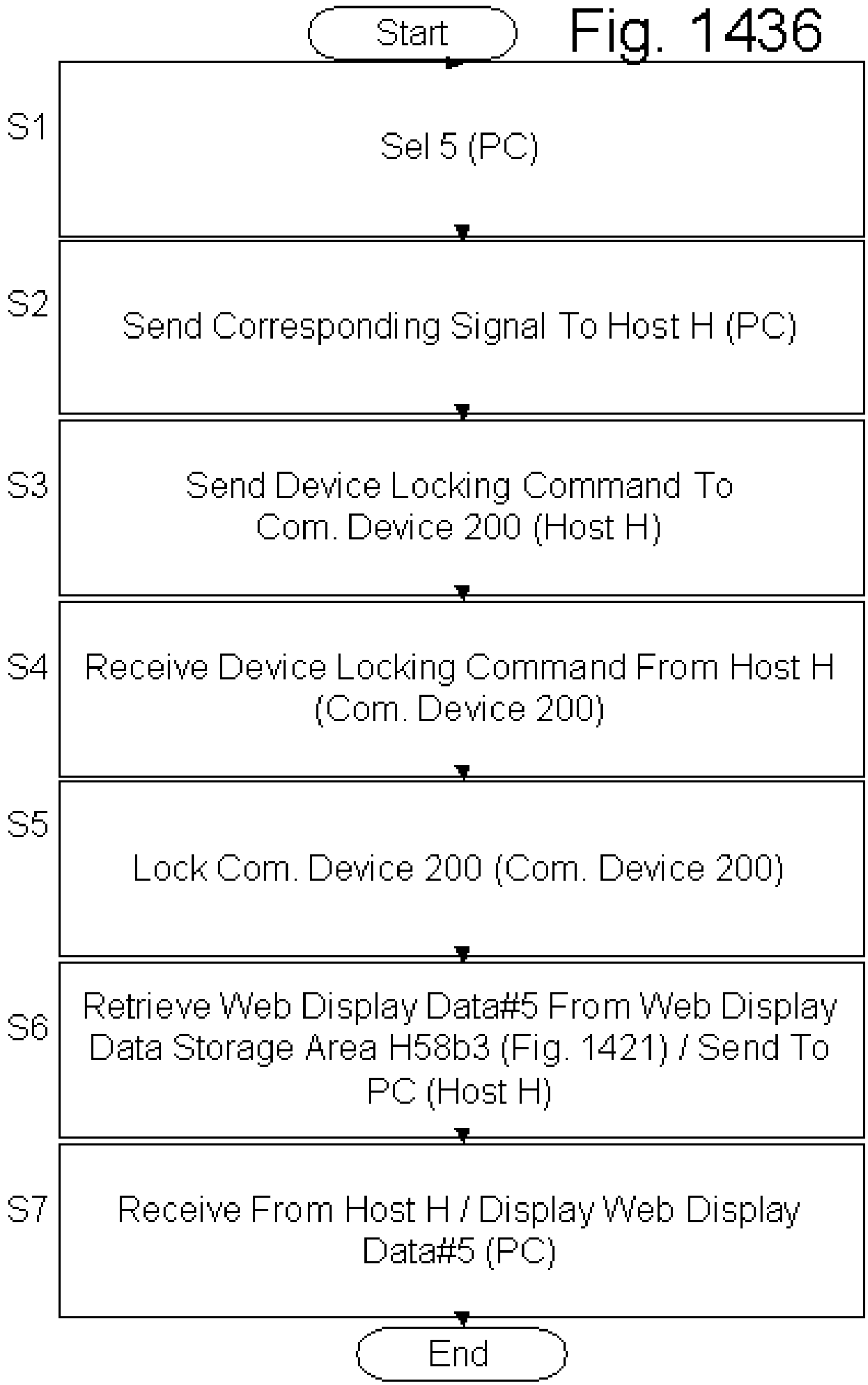

Fig. 1437
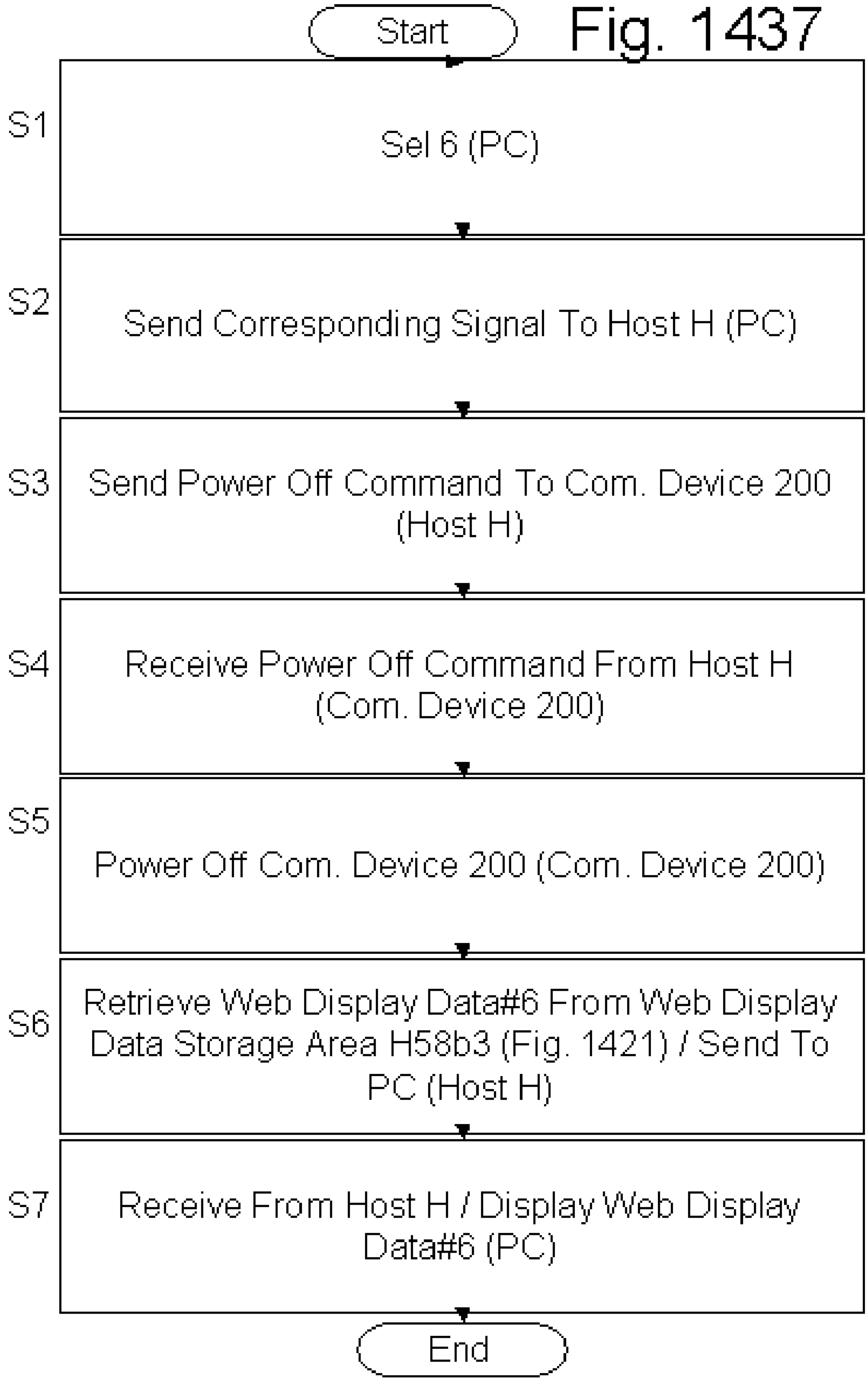

Fig. 1438
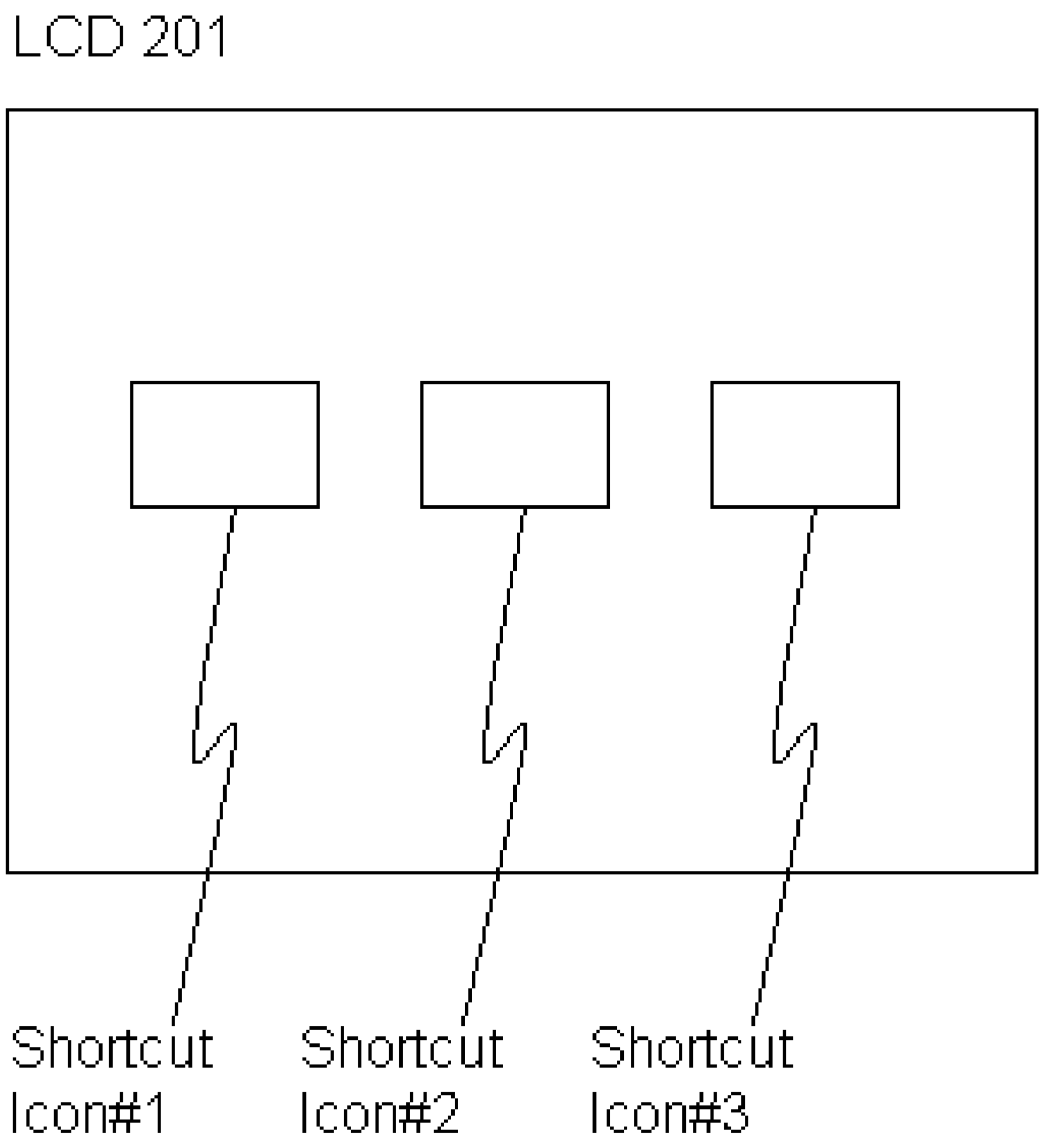

Fig. 1439
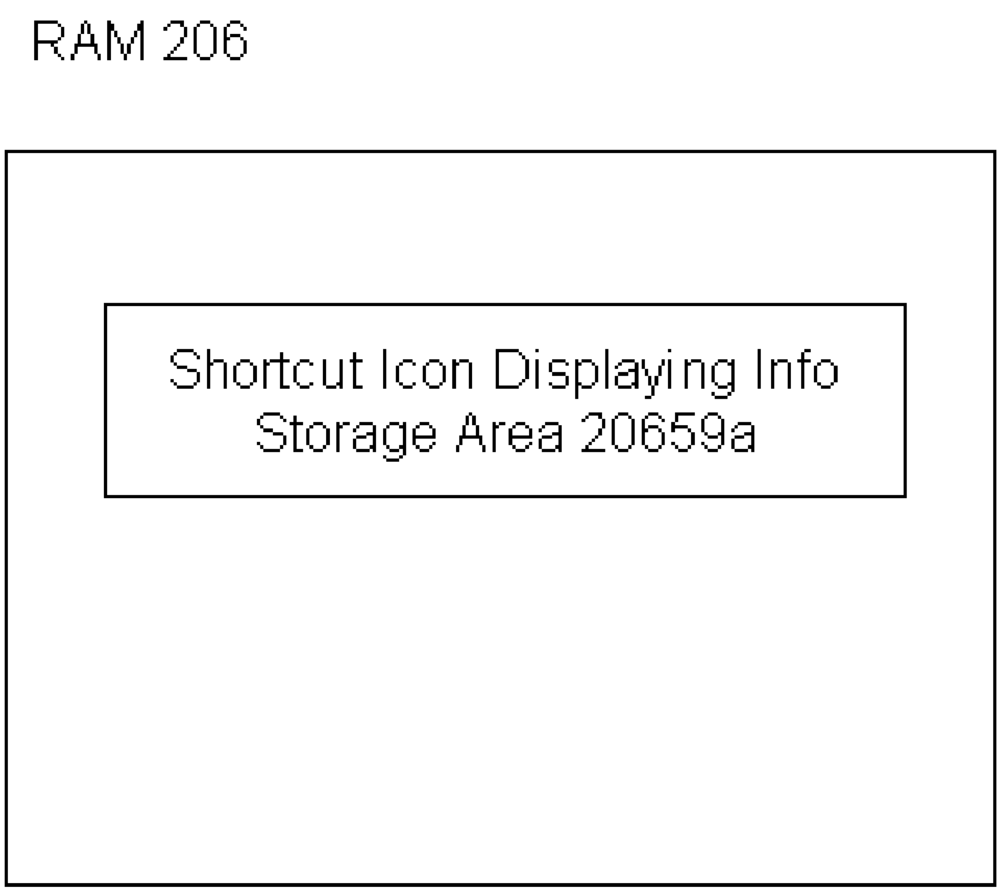

Fig. 1440
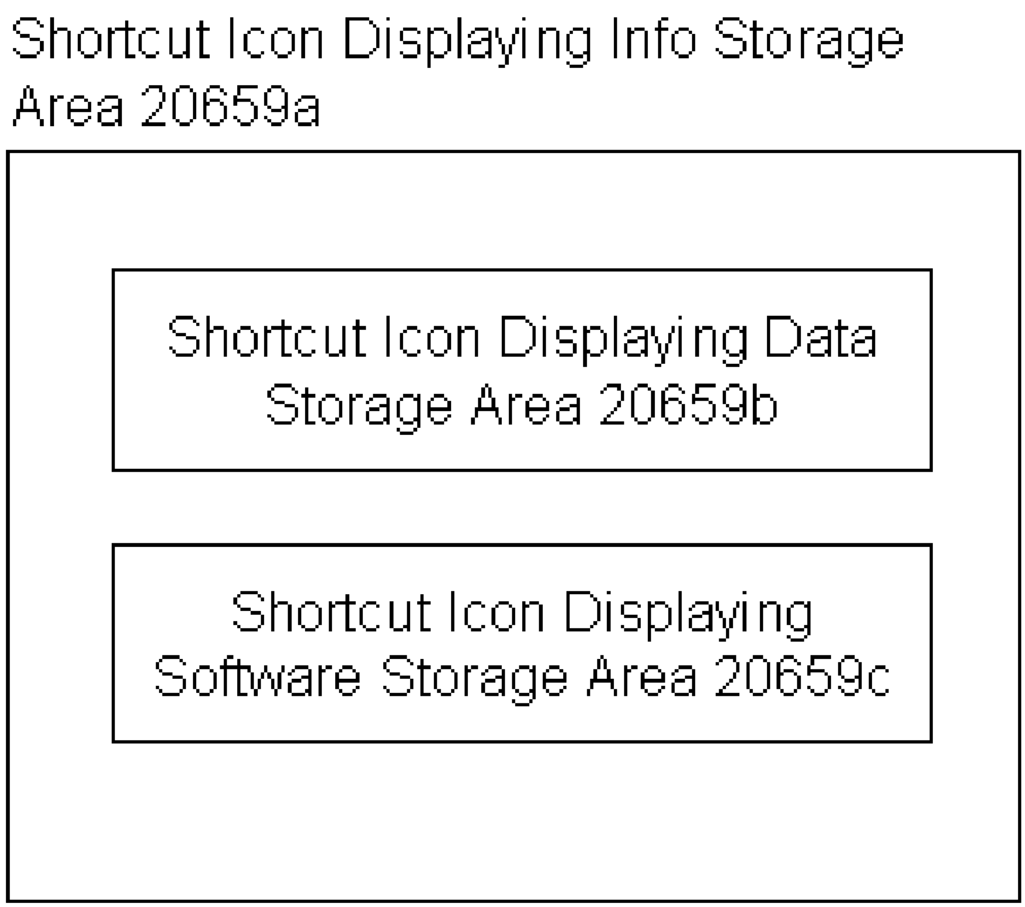

Fig. 1441
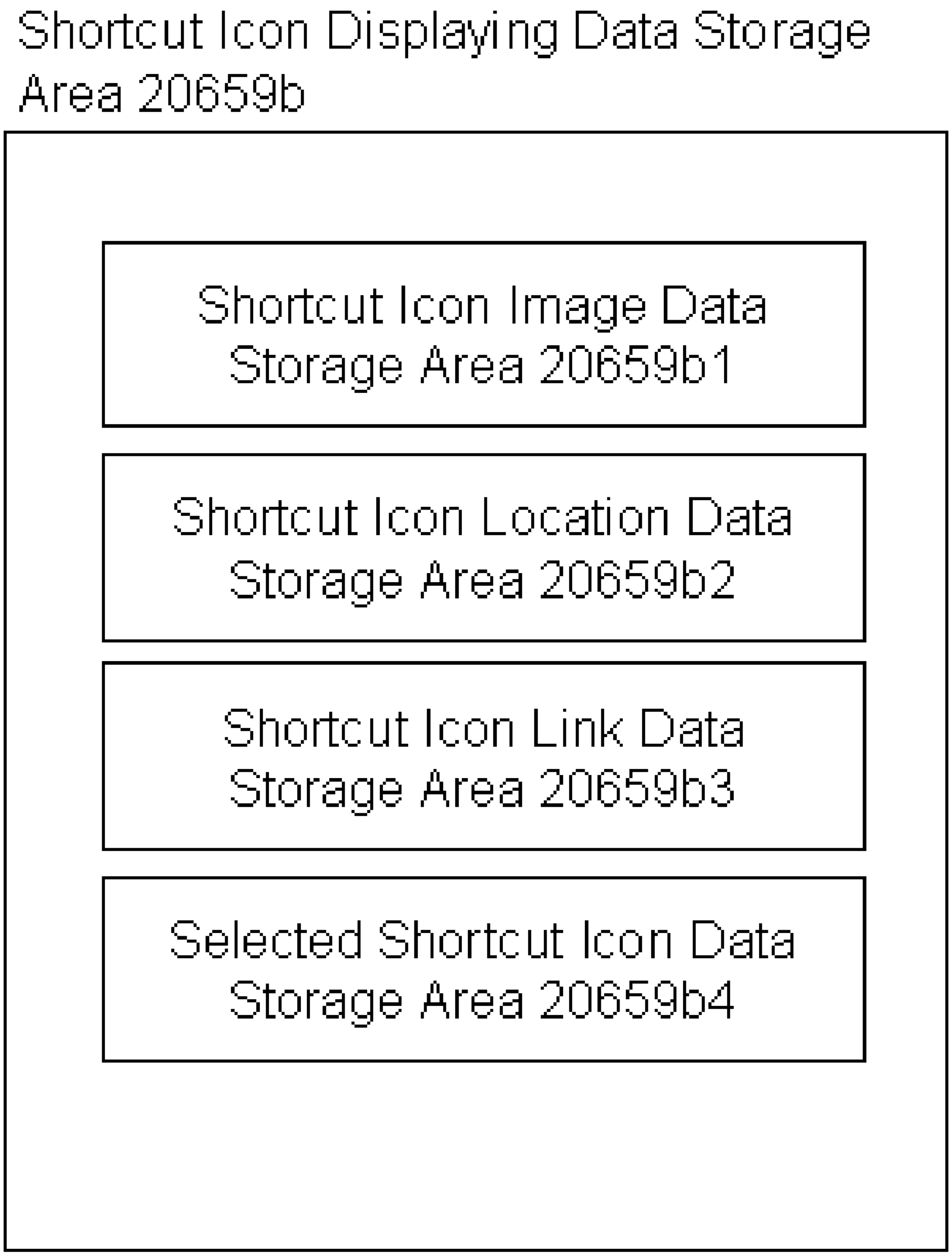

Fig. 1442

Shortcut Icon Image Data Storage Area 20659b1

| **Shortcut Icon ID** | **Shortcut Icon Image Data** |
|---|---|
| Shortcut Icon#1 | Shortcut Icon Image Data#1 |
| Shortcut Icon#2 | Shortcut Icon Image Data#2 |
| Shortcut Icon#3 | Shortcut Icon Image Data#3 |
| Shortcut Icon#4 | Shortcut Icon Image Data#4 |

Fig. 1443

Shortcut Icon Location Data Storage Area 20659b2

| **Shortcut Icon ID** | **Shortcut Icon Location Data** |
|---|---|
| Shortcut Icon#1 | Shortcut Icon Location Data#1 |
| Shortcut Icon#2 | Shortcut Icon Location Data#2 |
| Shortcut Icon#3 | Shortcut Icon Location Data#3 |
| Shortcut Icon#4 | Shortcut Icon Location Data#4 |

Fig. 1444

Shortcut Icon Link Data Storage Area 20659b3

| Shortcut Icon ID | Shortcut Icon Link Data |
|---|---|
| Shortcut Icon#1 | Shortcut Icon Link Data#1 |
| Shortcut Icon#2 | Shortcut Icon Link Data#2 |
| Shortcut Icon#3 | Shortcut Icon Link Data#3 |
| Shortcut Icon#4 | Shortcut Icon Link Data#4 |

Fig. 1445
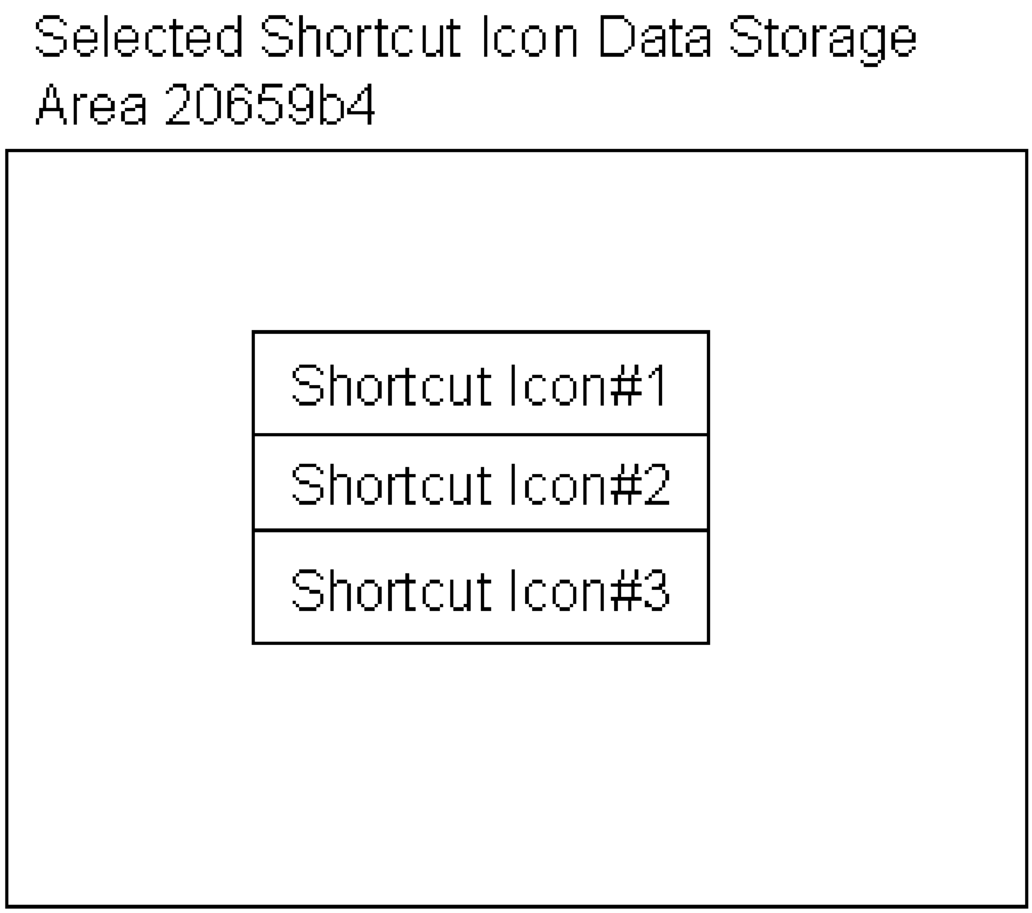

Fig. 1446
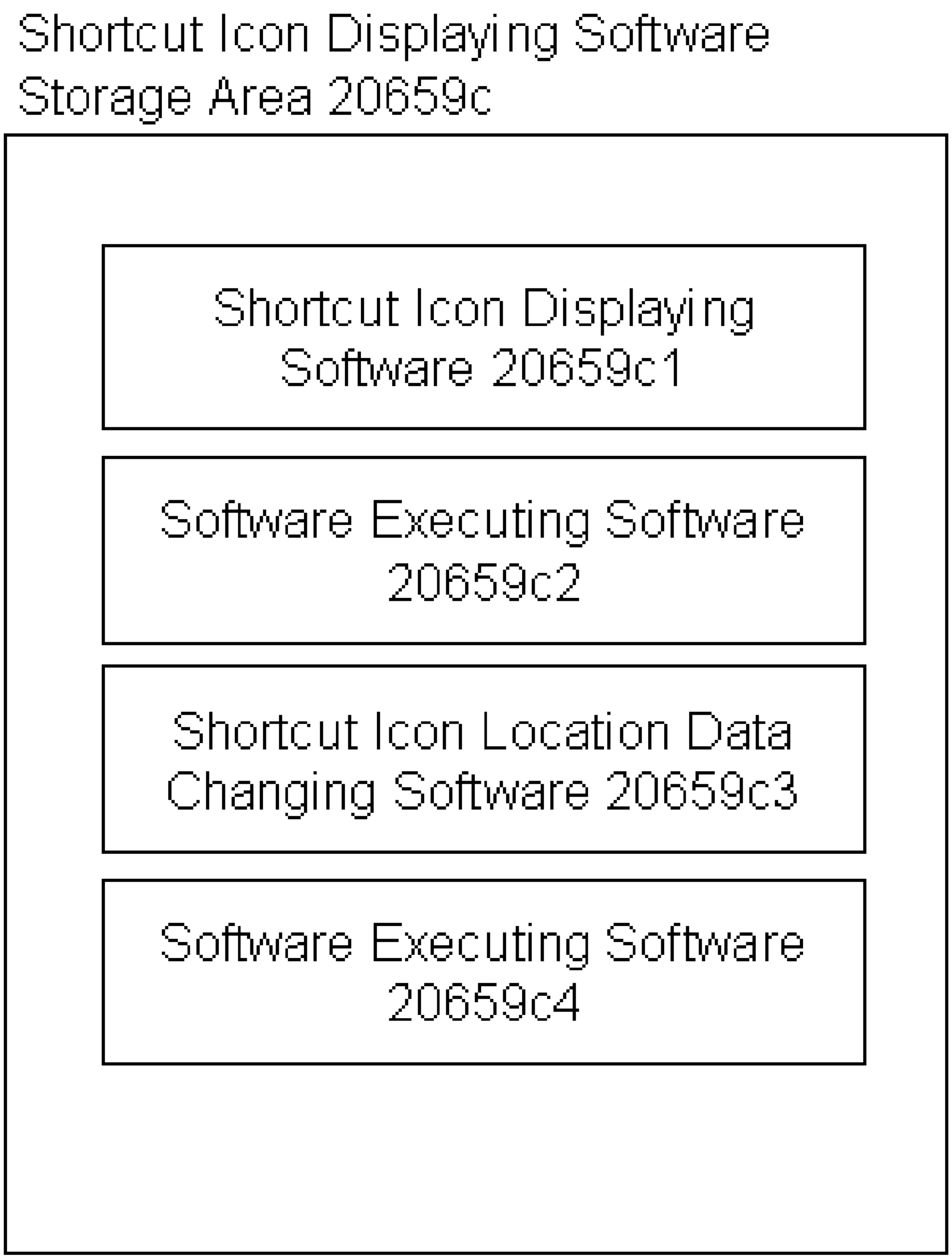

Fig. 1447
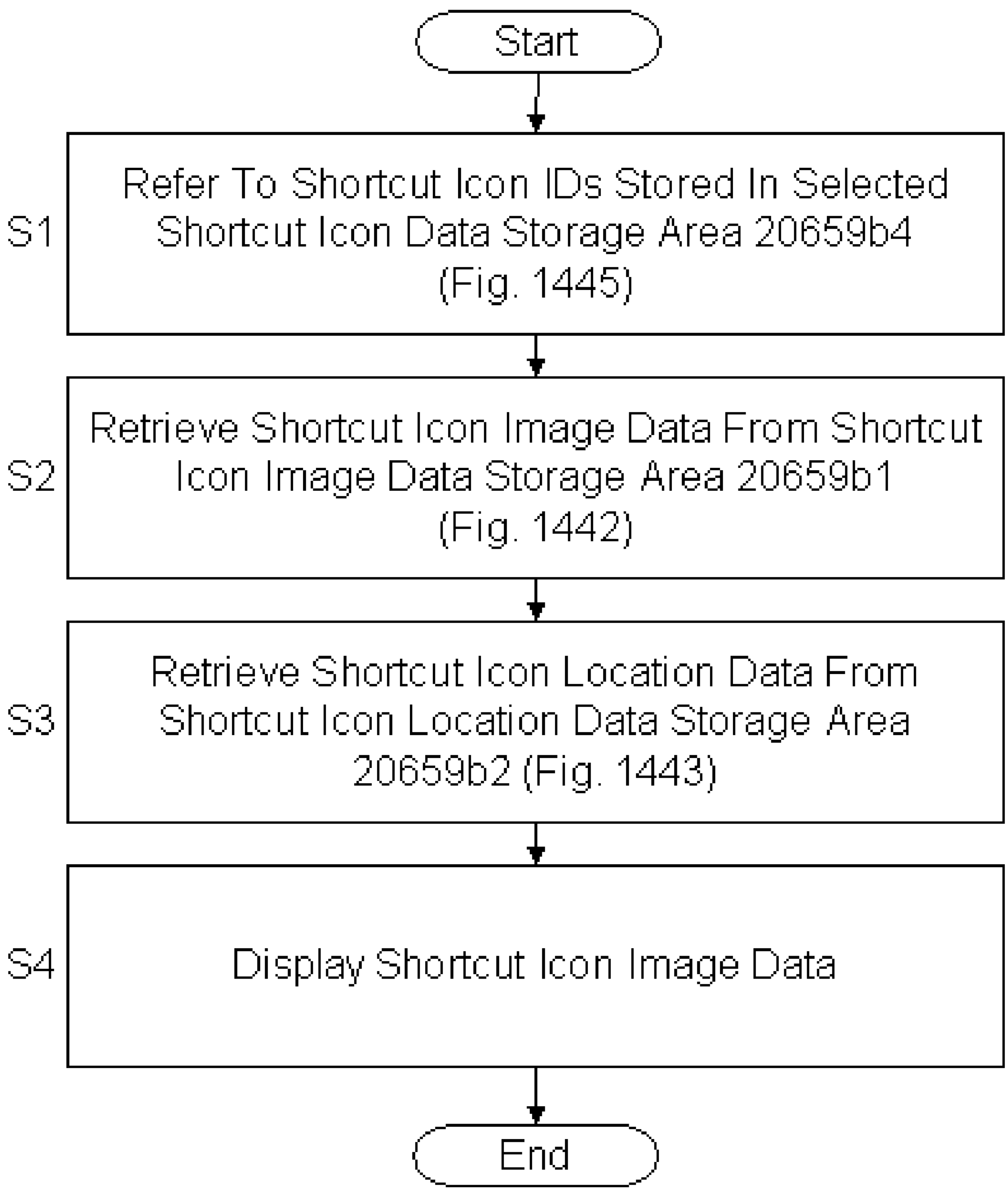

Fig. 1448
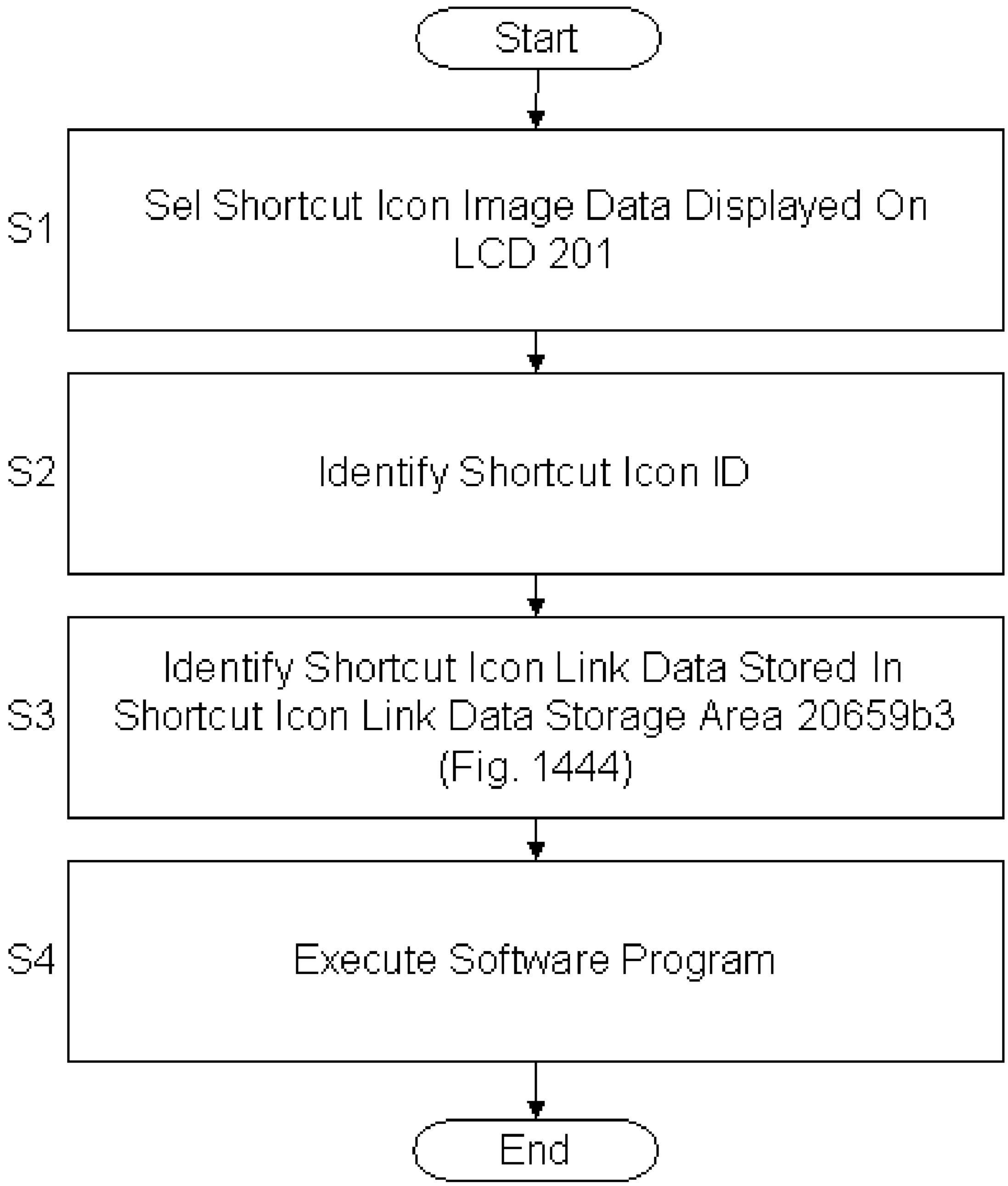

Fig. 1449
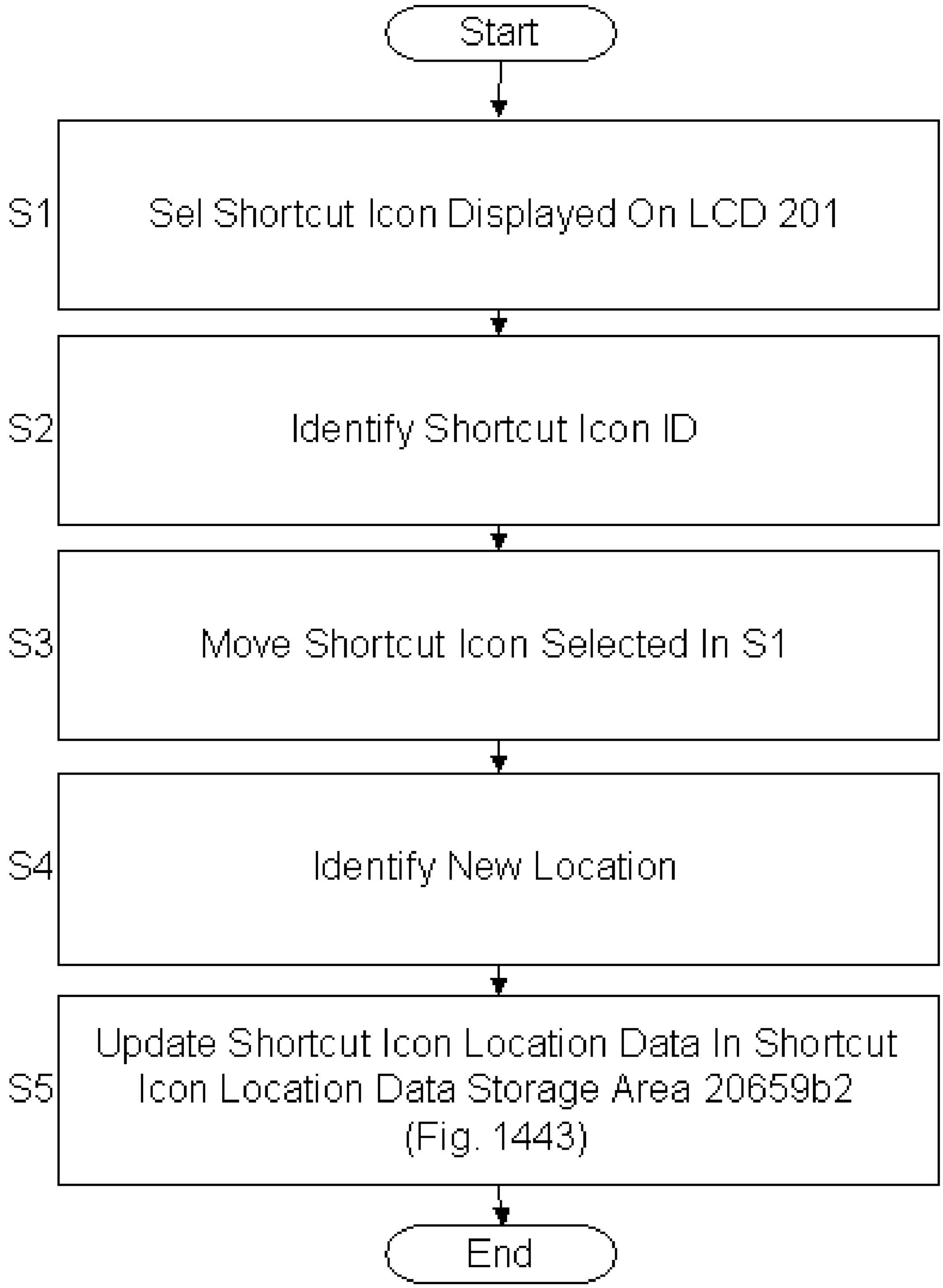

Fig. 1450
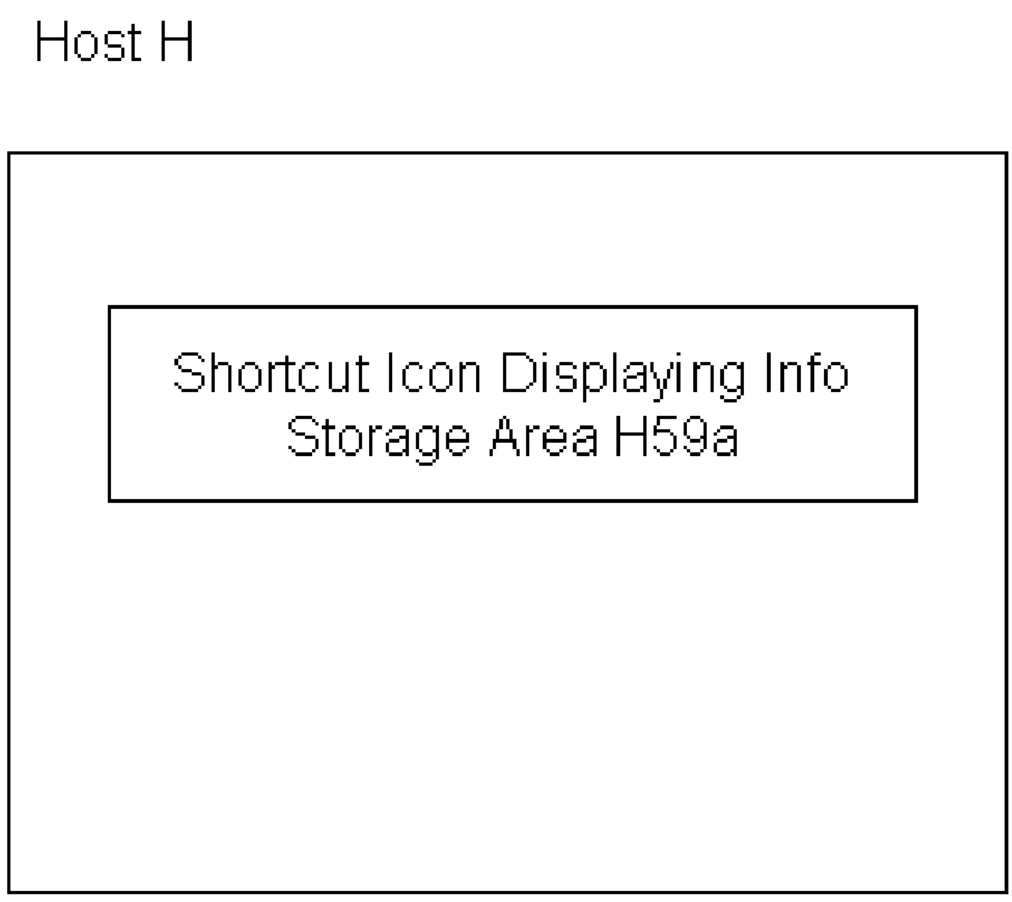

Fig. 1451
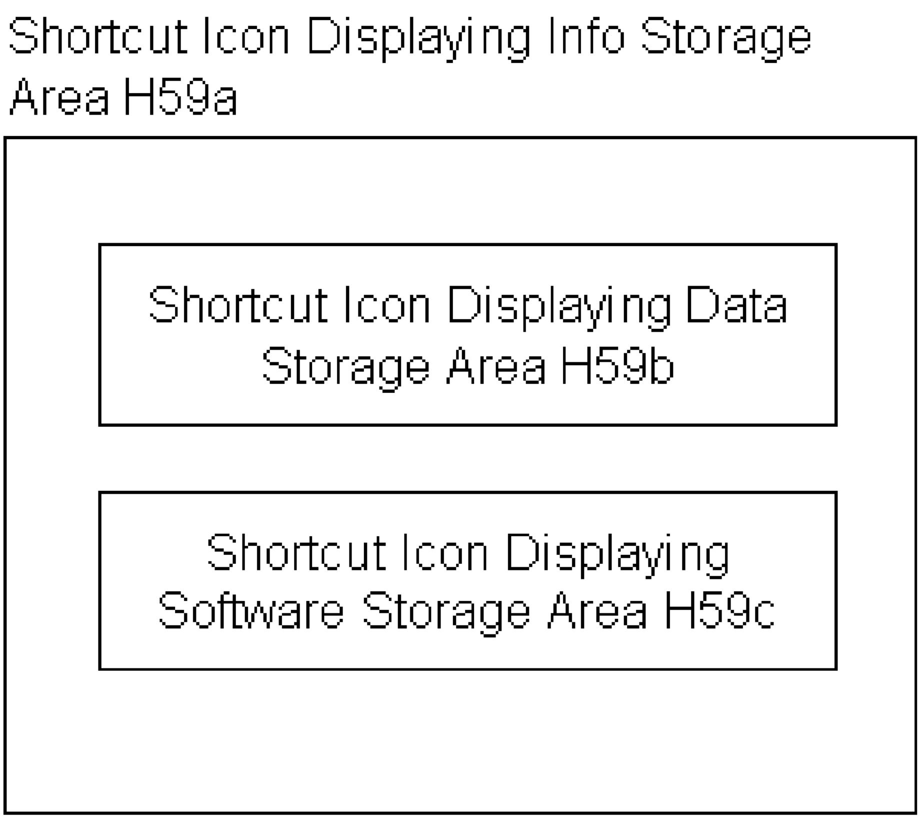

Fig. 1452
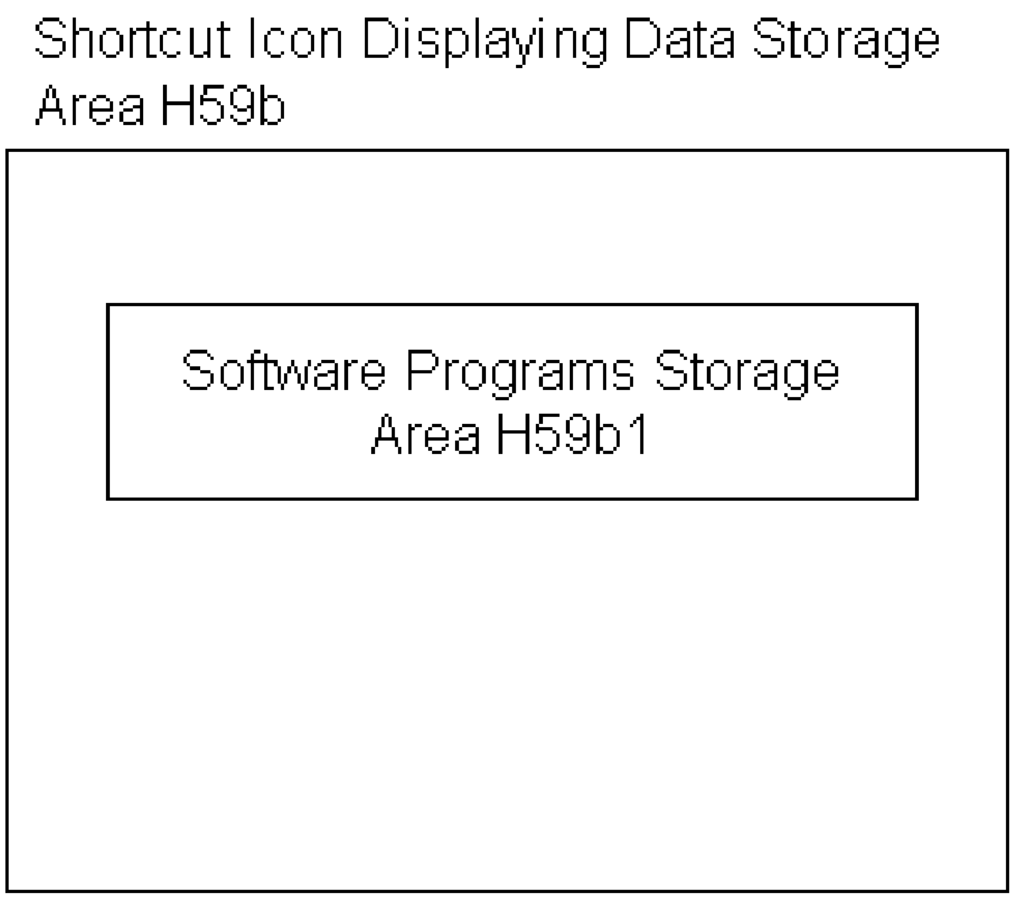

Fig. 1453

Software Programs Storage Area
H59b1

| **Software ID** | **Software Program** |
|---|---|
| Software#3 | Software Program#3 |
| Software#4 | Software Program#4 |
| Software#5 | Software Program#5 |
| Software#6 | Software Program#6 |

Fig. 1454
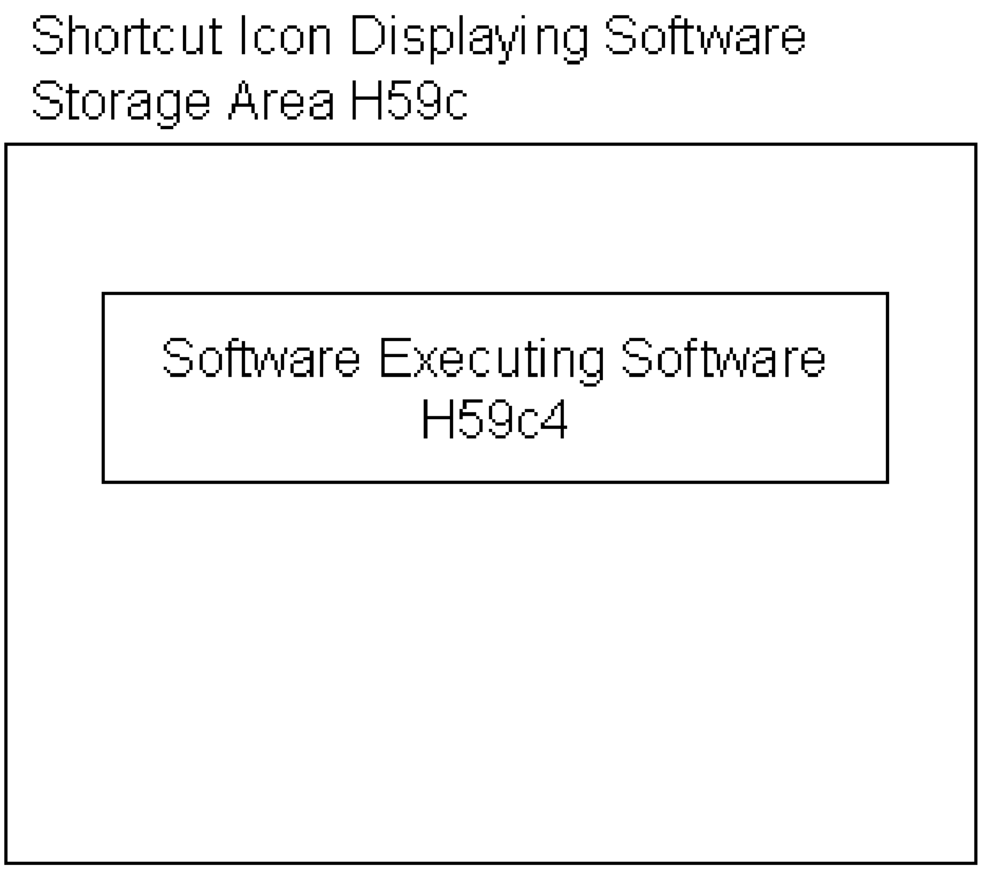

Fig. 1455
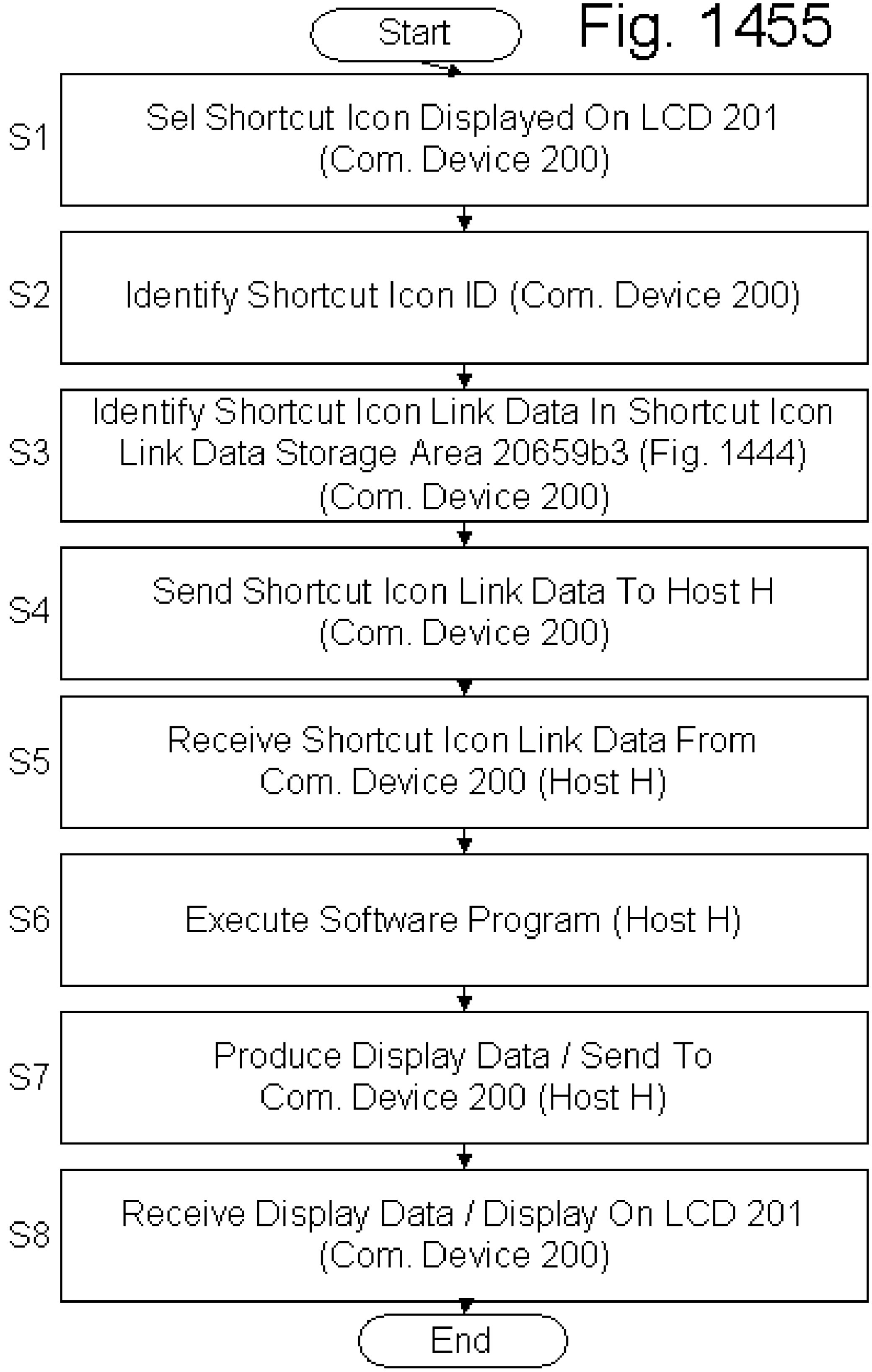

Fig. 1456
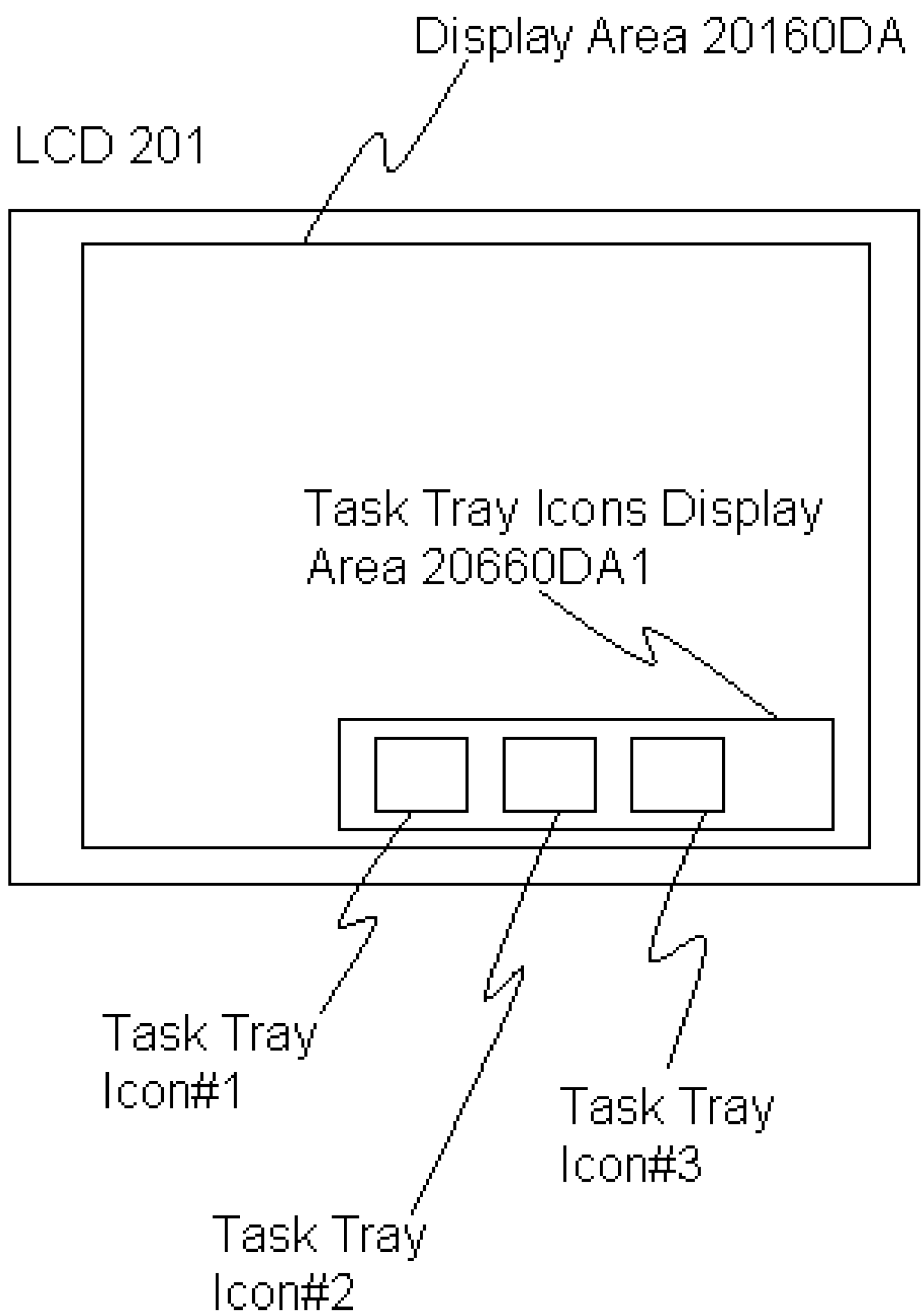

Fig. 1457
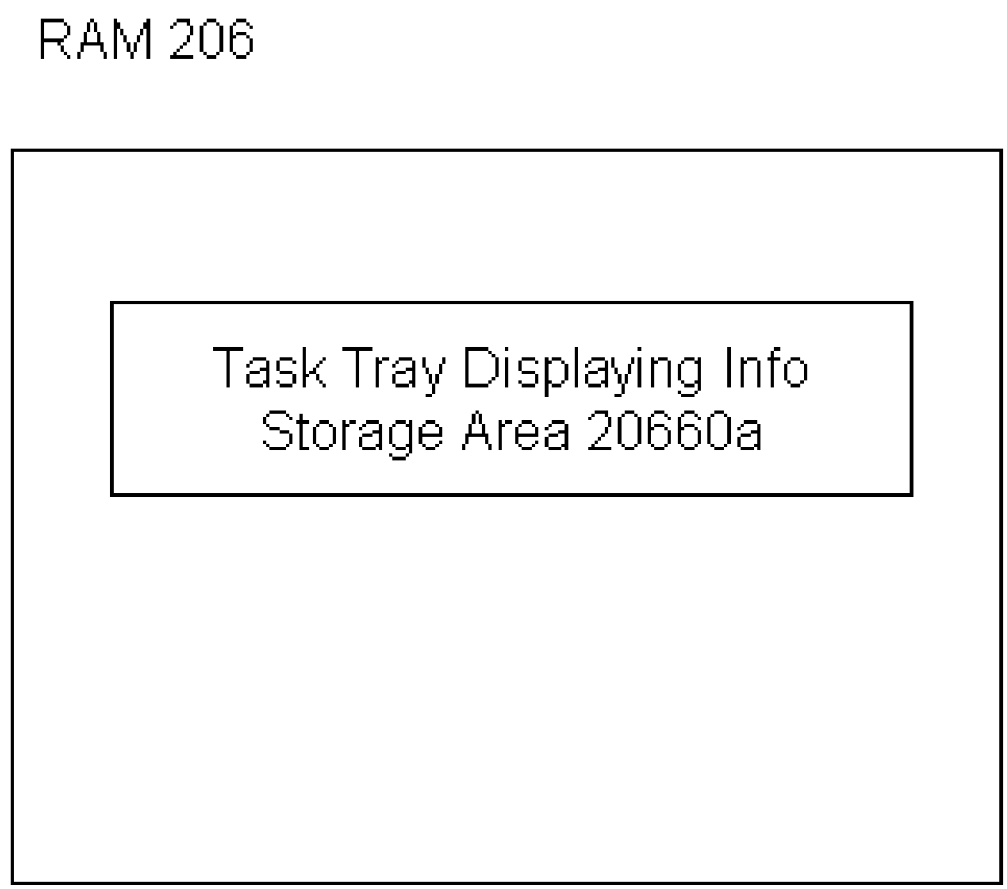

Fig. 1458
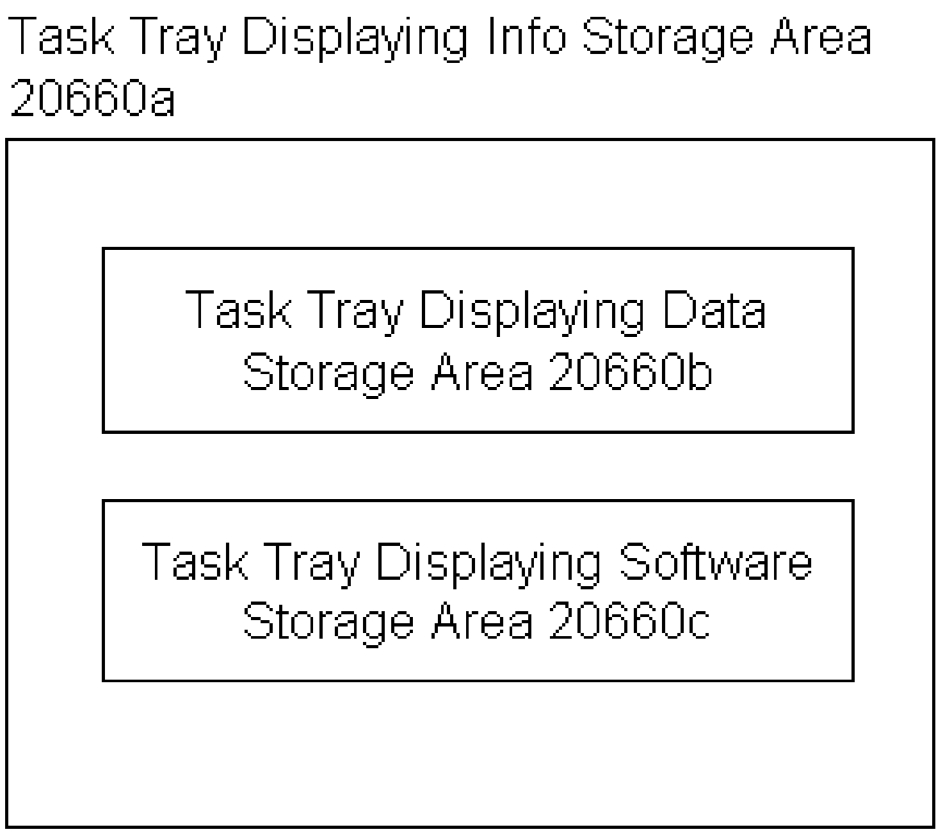

Fig. 1459
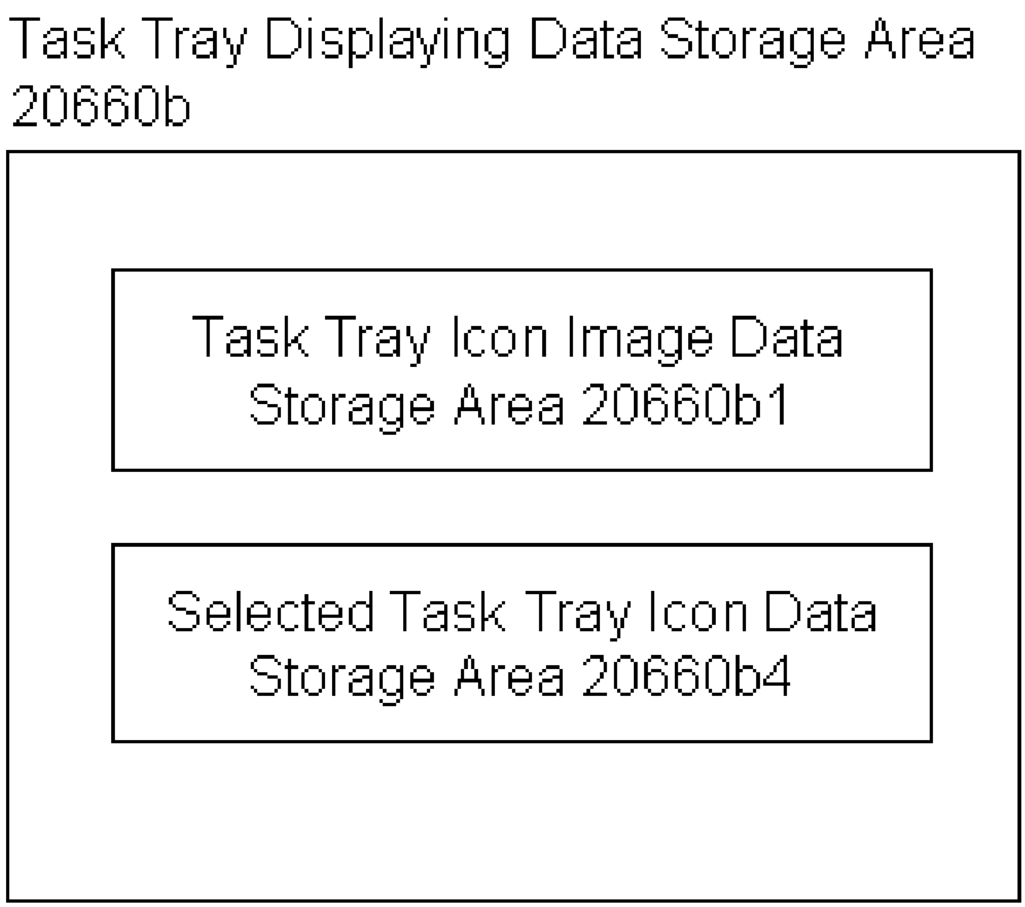

Fig. 1460

Task Tray Icon Image Data Storage Area 20660b1

| Task Tray Icon ID | Task Tray Icon Image Data |
|---|---|
| Task Tray Icon#1 | Task Tray Icon Image Data#1 |
| Task Tray Icon#2 | Task Tray Icon Image Data#2 |
| Task Tray Icon#3 | Task Tray Icon Image Data#3 |
| Task Tray Icon#4 | Task Tray Icon Image Data#4 |

Fig. 1461

Task Tray Icon Link Data Storage Area 20660b3

| Task Tray Icon ID | Task Tray Icon Link Data |
|---|---|
| Task Tray Icon#1 | Task Tray Icon Link Data#1 |
| Task Tray Icon#2 | Task Tray Icon Link Data#2 |
| Task Tray Icon#3 | Task Tray Icon Link Data#3 |
| Task Tray Icon#4 | Task Tray Icon Link Data#4 |

Fig. 1462
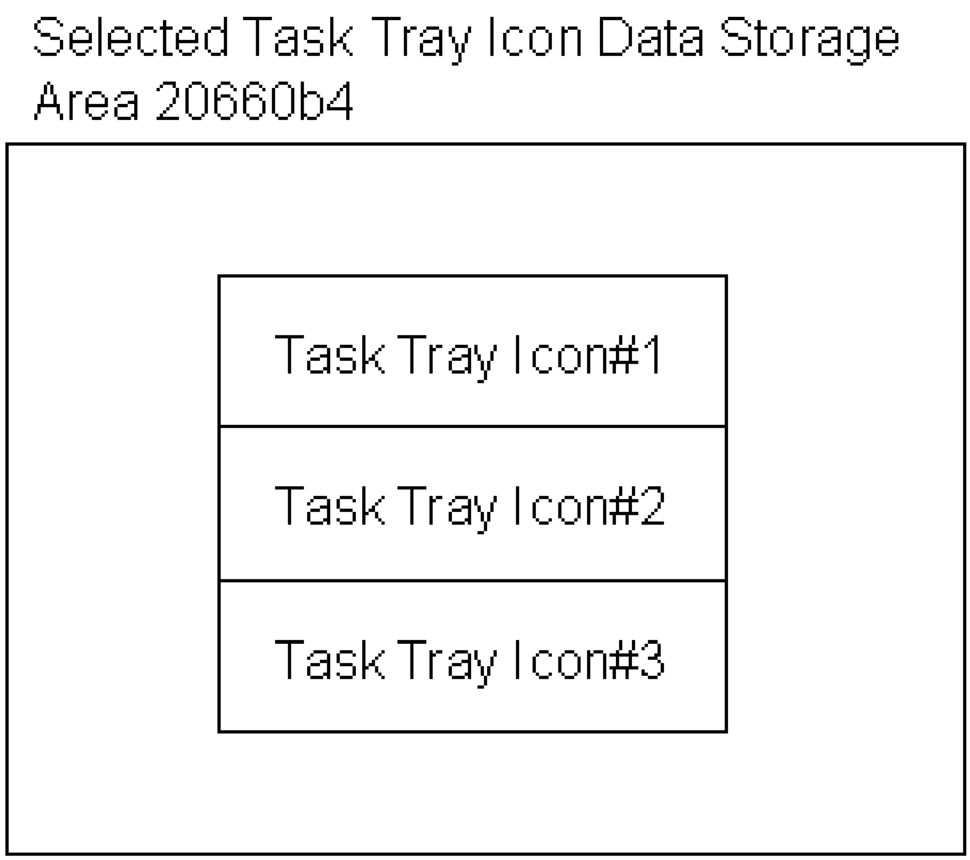

Fig. 1463
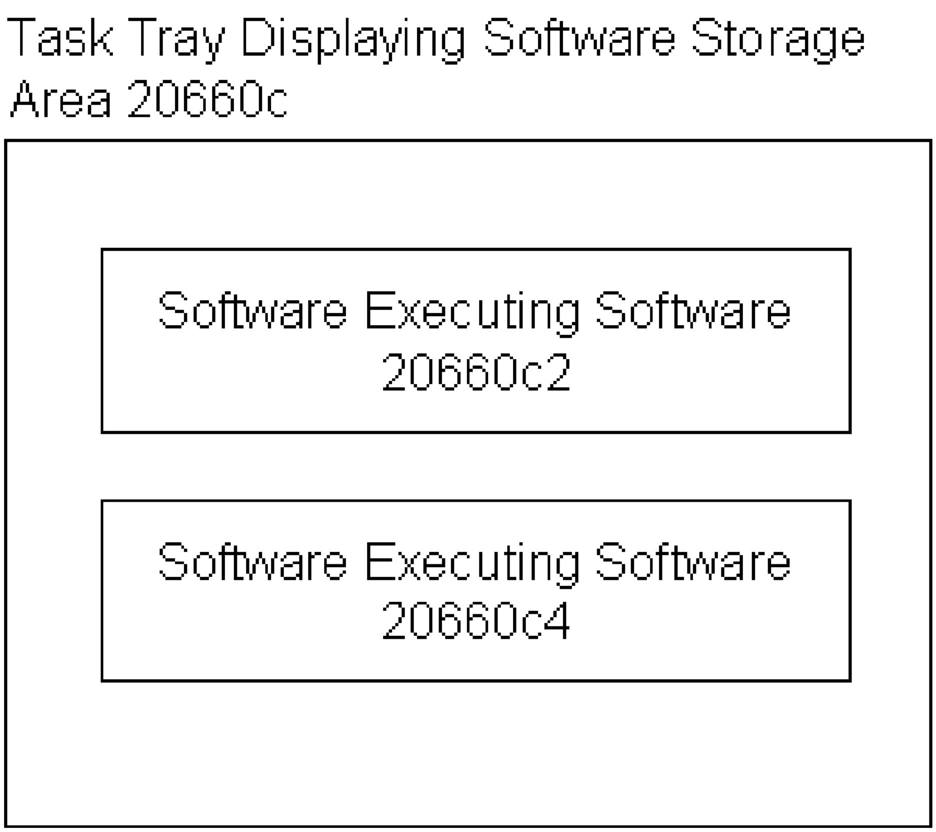

Fig. 1464
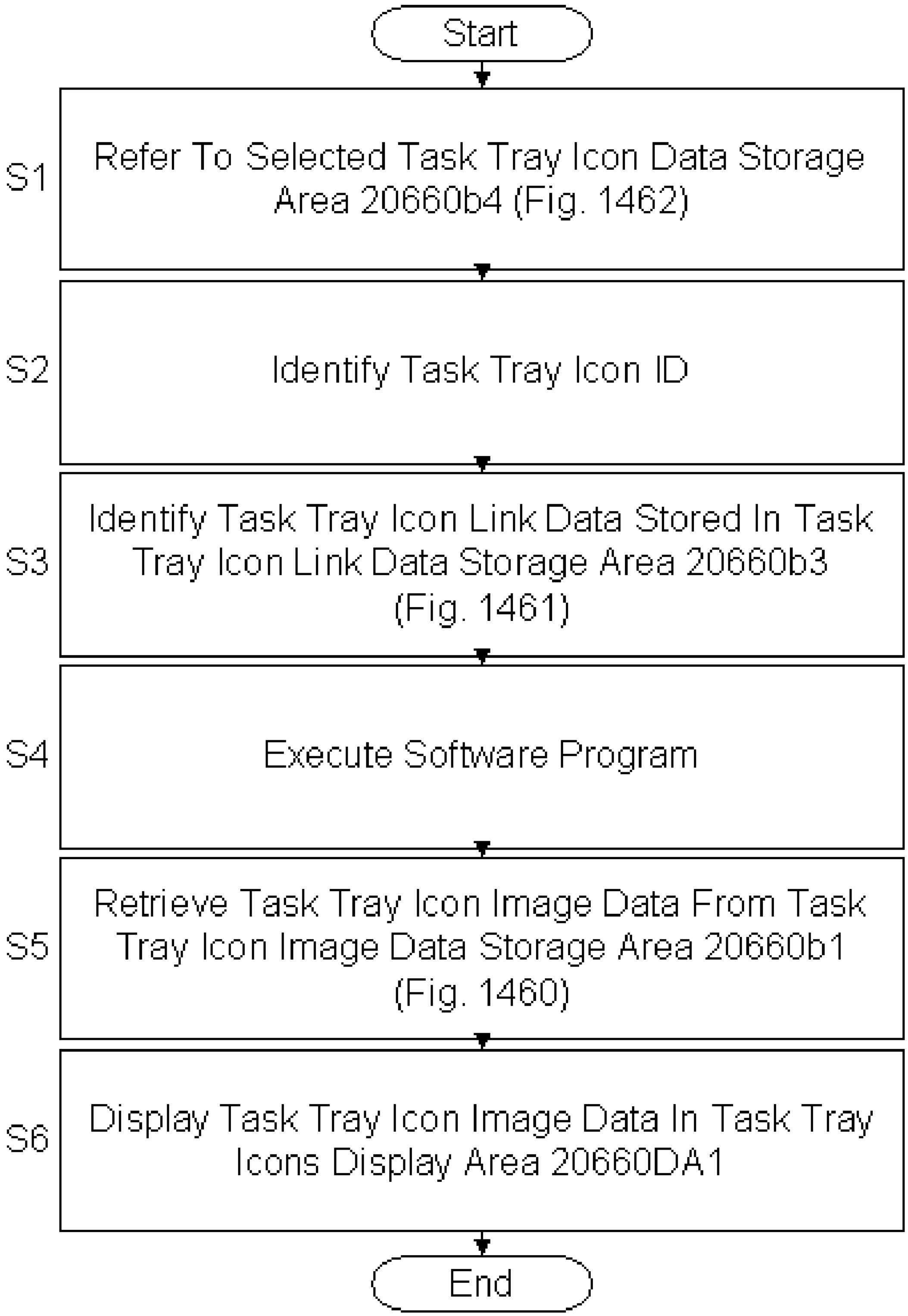

Fig. 1465
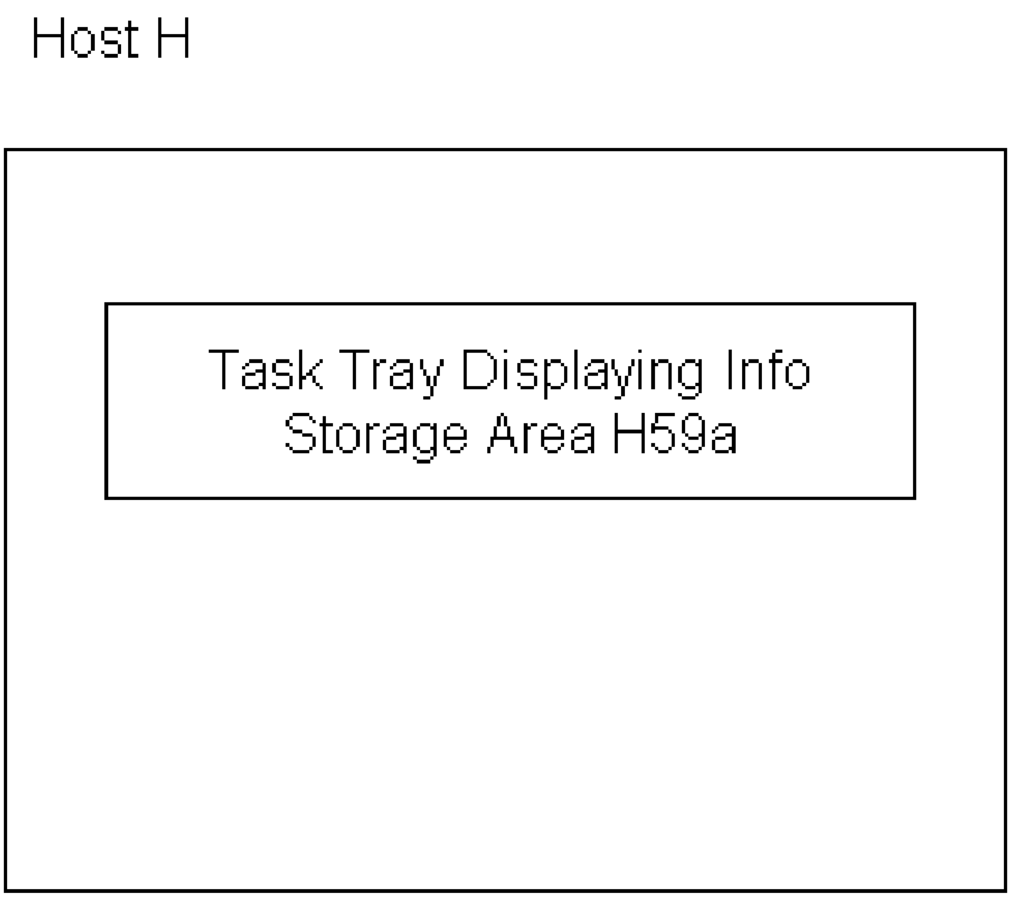

Fig. 1466
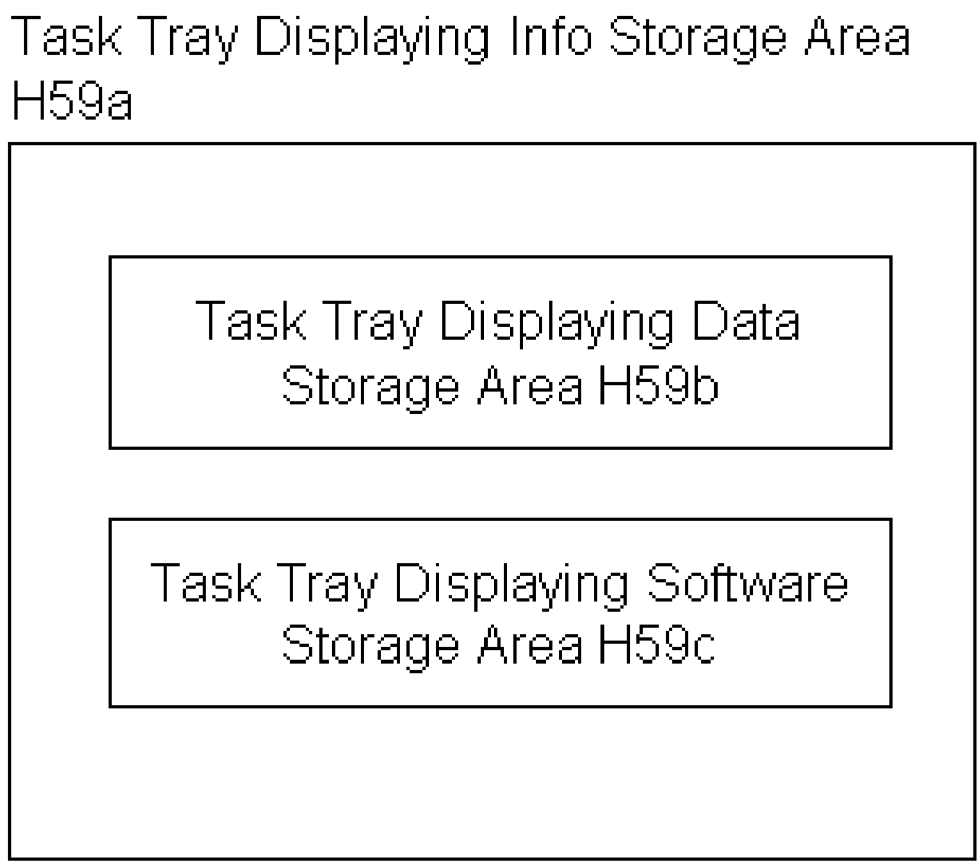

Fig. 1467
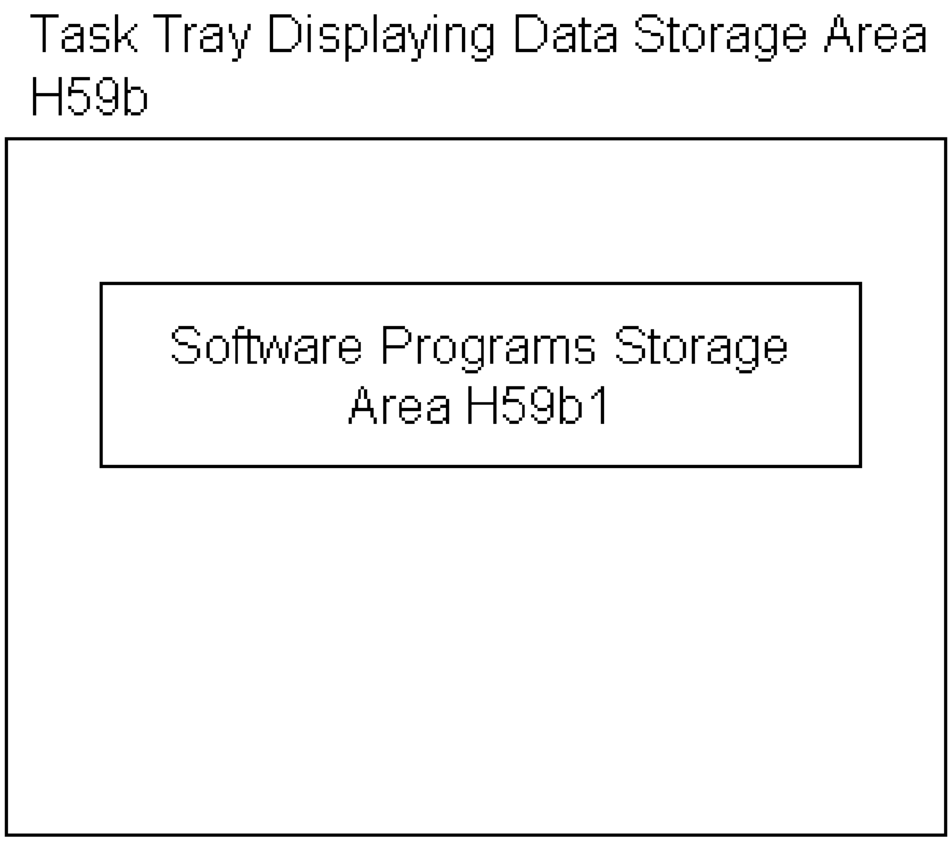

Fig. 1468

Software Programs Storage Area
H59b1

| Software ID | Software Program |
|---|---|
| Software#3 | Software Program#3 |
| Software#4 | Software Program#4 |
| Software#5 | Software Program#5 |
| Software#6 | Software Program#6 |

Fig. 1469
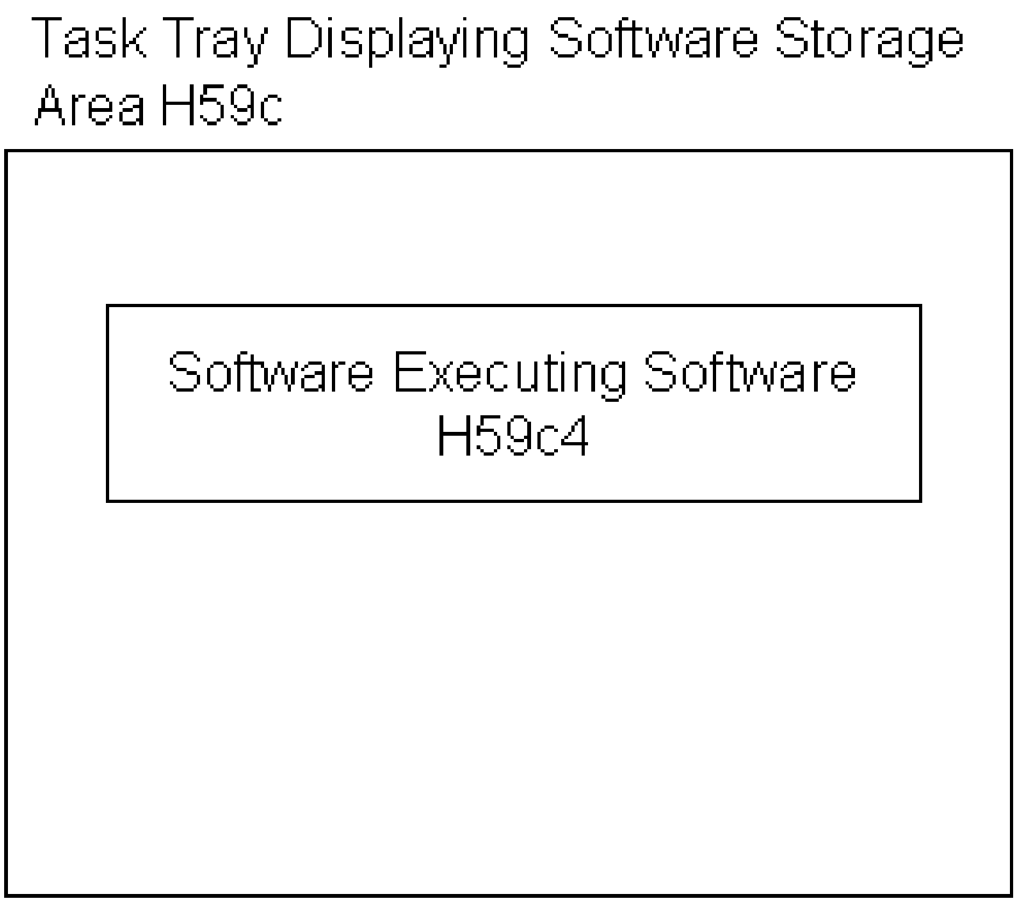

Fig. 1470
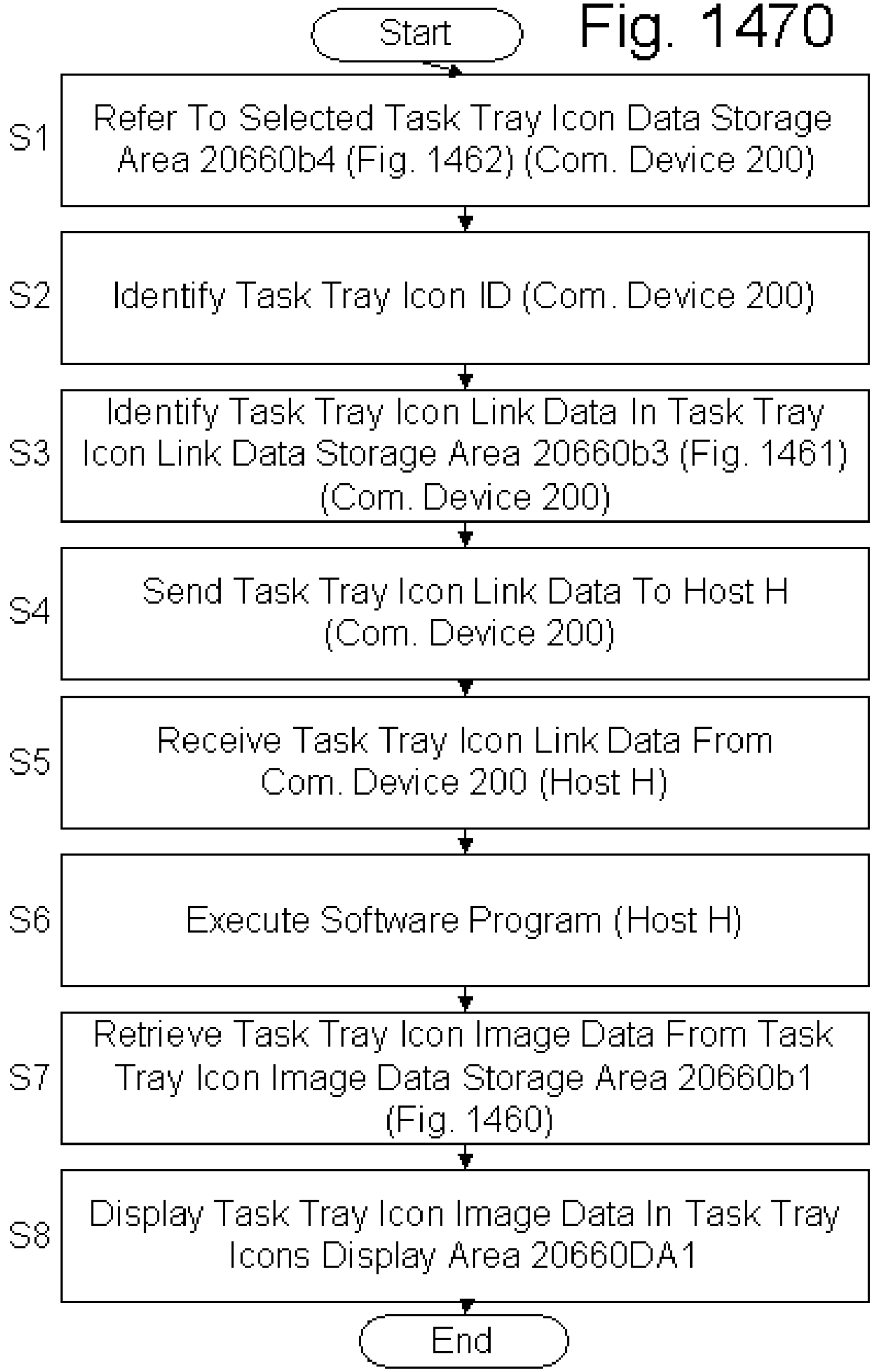

Fig. 1471
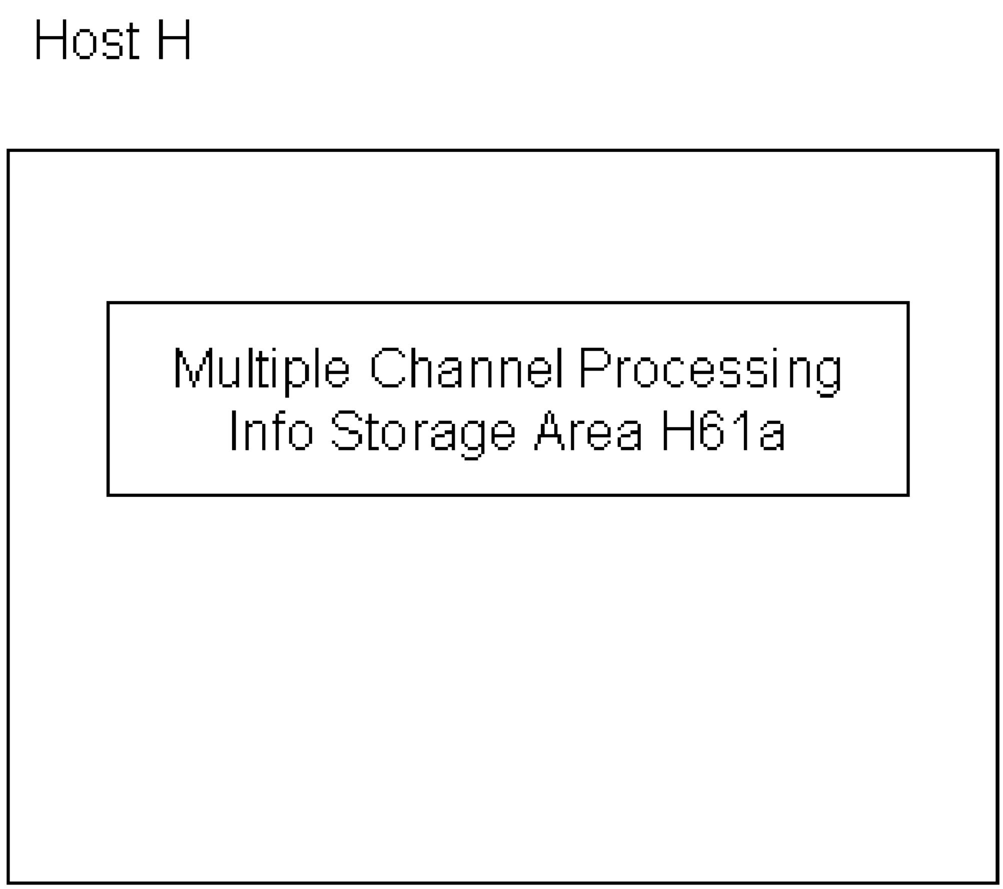

Fig. 1472
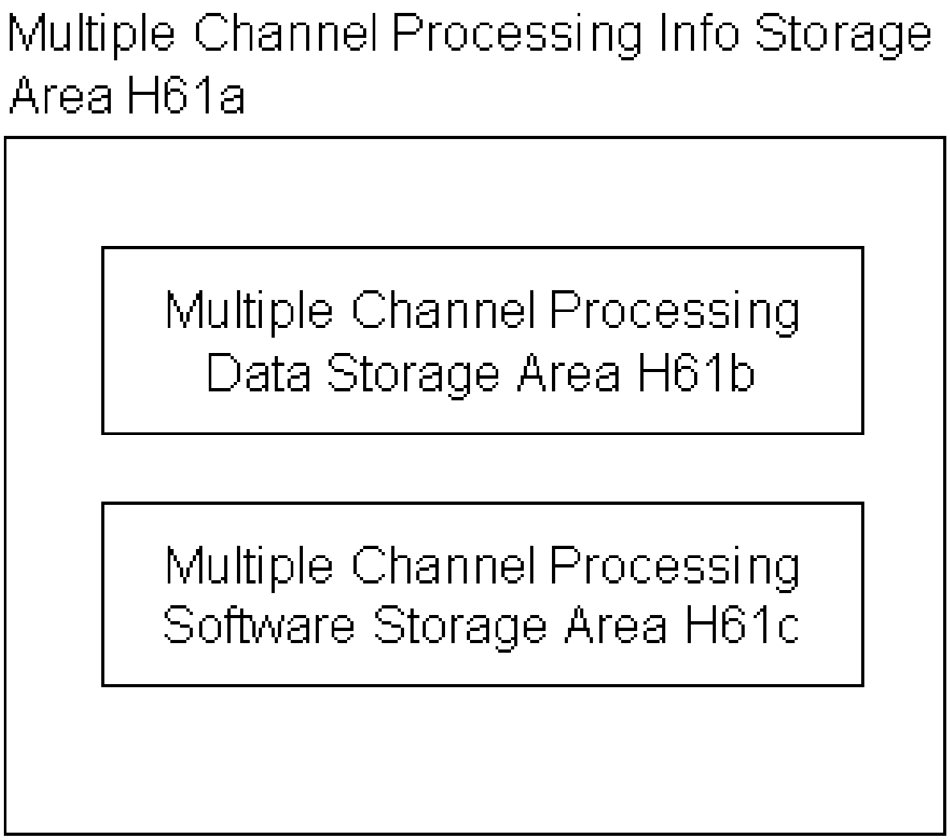

Fig. 1473
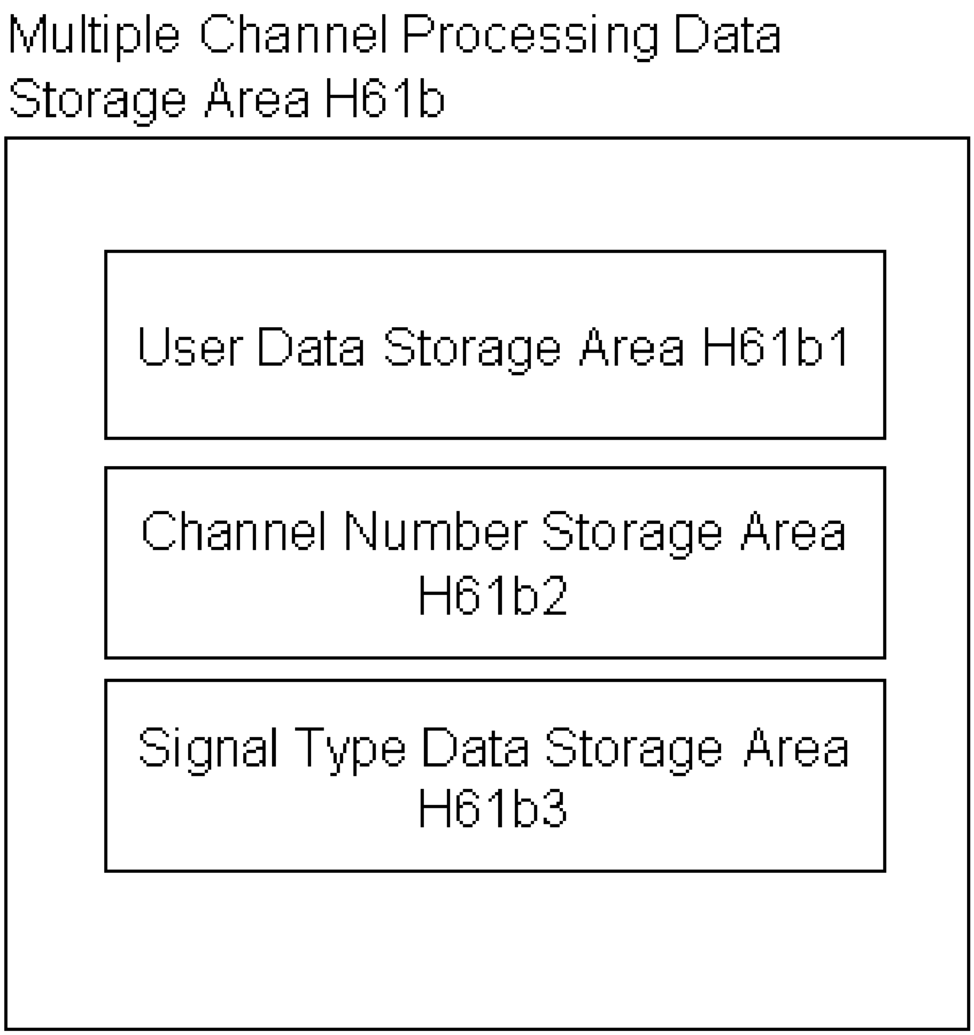

Fig. 1474

User Data Storage Area H61b1

| User ID | User Data |
|---|---|
| User#1 | User Data#1 |
| User#2 | User Data#2 |
| User#3 | User Data#3 |
| User#4 | User Data#4 |

Fig. 1475

Channel Number Storage Area H61b2

| Channel ID | User ID |
|---|---|
| Channel#1 | User#1 |
| Channel#2 | |
| Channel#3 | User#3 |
| Channel#4 | User#4 |

Fig. 1476

Channel Number Storage Area H61b2

| Channel ID | User ID |
|---|---|
| Channel#1 | User#1 |
| Channel#2 | User#1 |
| Channel#3 | User#3 |
| Channel#4 | User#4 |

Fig. 1477

Signal Type Data Storage Area H61b3

| Channel ID | Signal Type Data |
|---|---|
| Channel#1 | cdma2000 |
| Channel#2 | cdma2000 |
| Channel#3 | W-CDMA |
| Channel#4 | cdma2000 |

Fig. 1478

Signal Type Data Storage Area H61b3

| Channel ID | Signal Type Data |
|---|---|
| Channel#1 | cdma2000 |
| Channel#2 | W-CDMA |
| Channel#3 | W-CDMA |
| Channel#4 | cdma2000 |

Fig. 1479
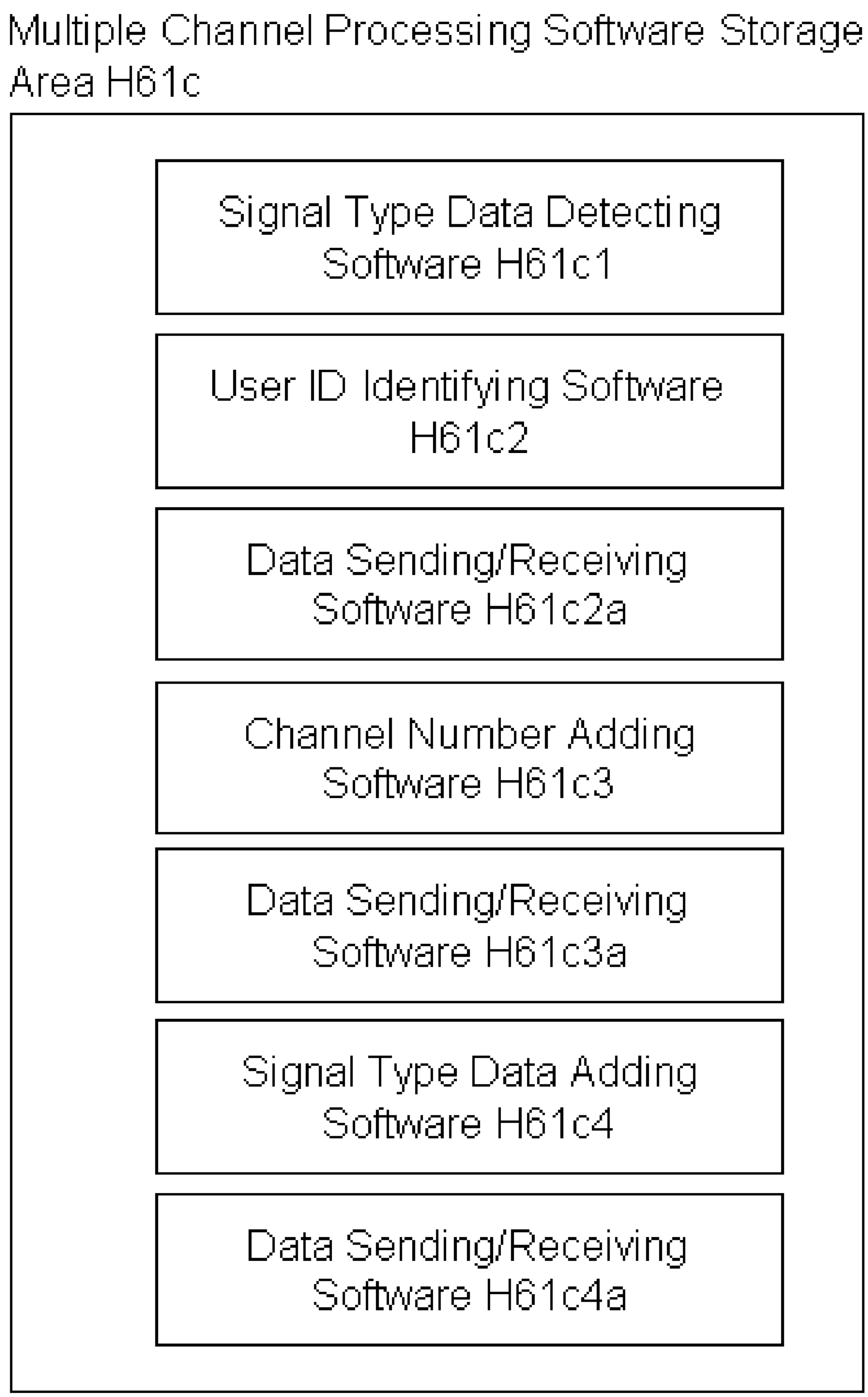

Fig. 1480
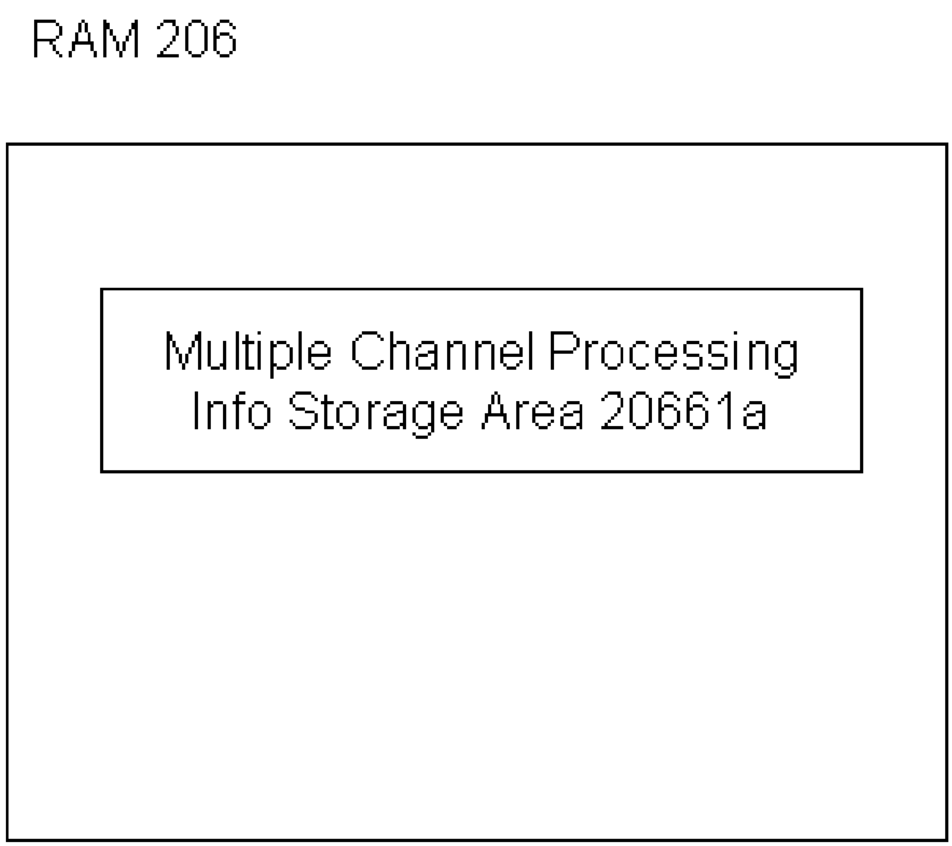

Fig. 1481
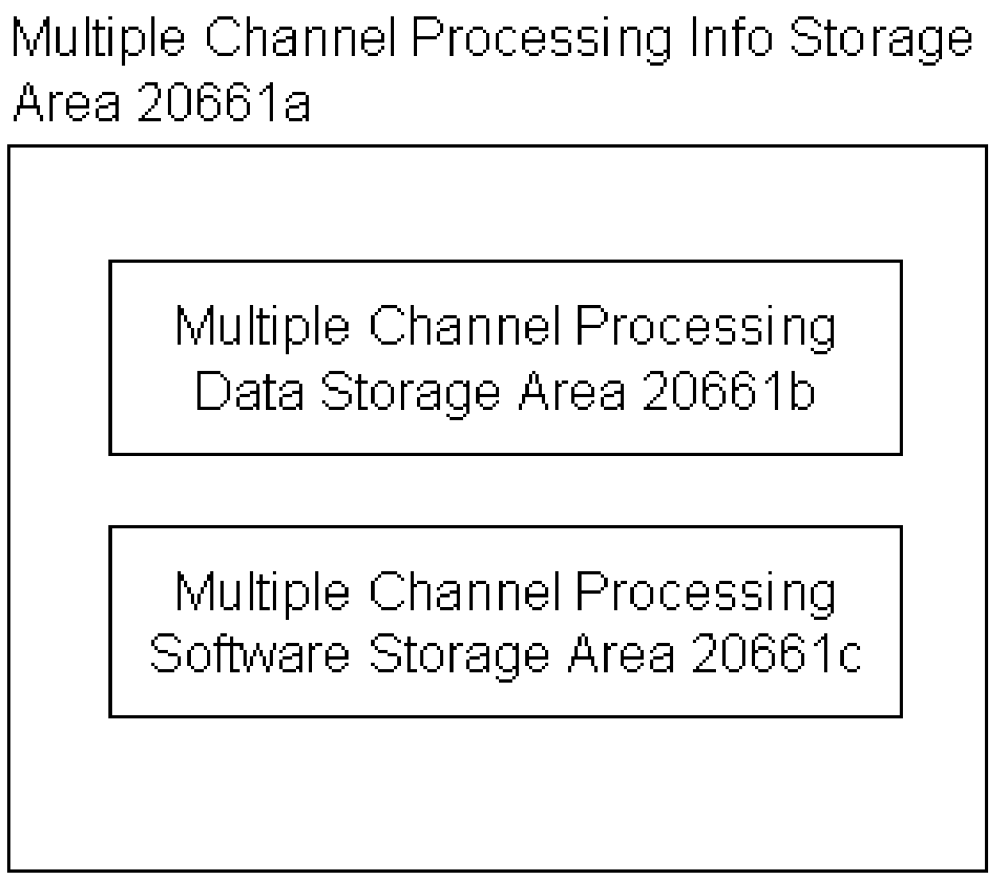

Fig. 1481a
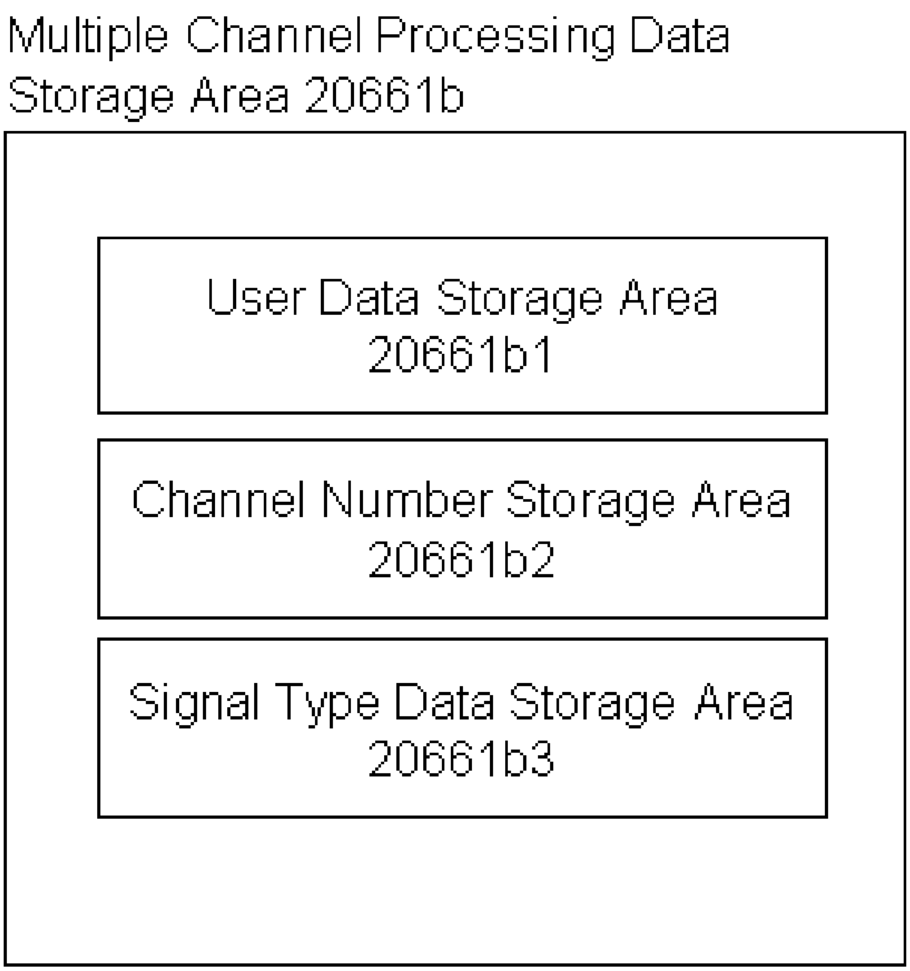

Fig. 1482

User Data Storage Area 20661b1

| User ID | User Data |
|---|---|
| User#1 | User Data#1 |

Fig. 1483

Channel Number Storage Area 20661b2

| Channel ID | User ID |
|---|---|
| Channel#1 | User#1 |

Fig. 1484

Channel Number Storage Area 20661b2

| Channel ID | User ID |
| --- | --- |
| Channel#1 | User#1 |
| Channel#2 | User#1 |

Fig. 1485

Signal Type Data Storage Area
20661b3

| Channel ID | Signal Type Data |
|---|---|
| Channel#1 | cdma2000 |
| Channel#2 | cdma2000 |

Fig. 1486

Signal Type Data Storage Area
20661b3

| Channel ID | Signal Type Data |
|---|---|
| Channel#1 | cdma2000 |
| Channel#2 | W-CDMA |

Fig. 1487
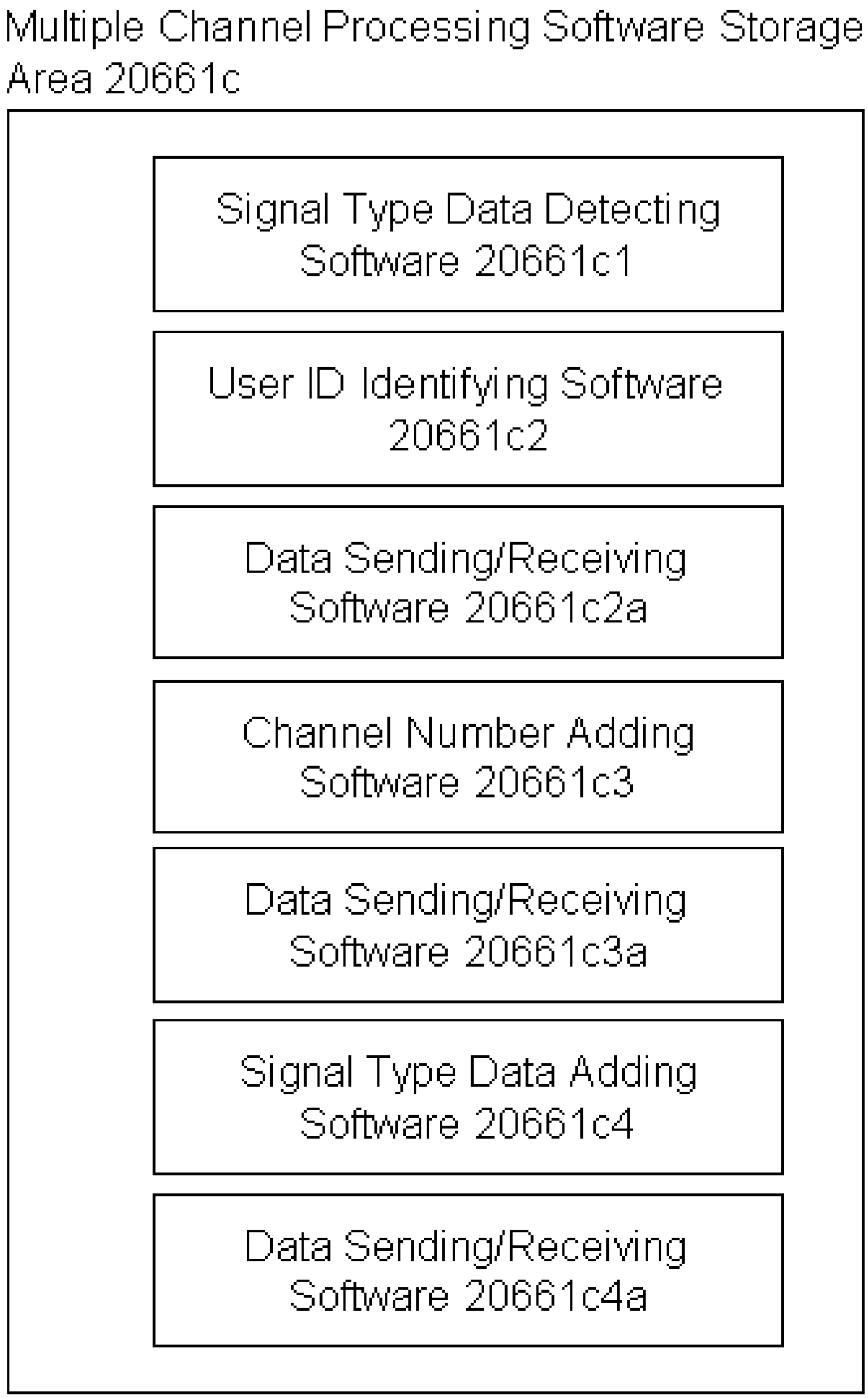

Fig. 1488
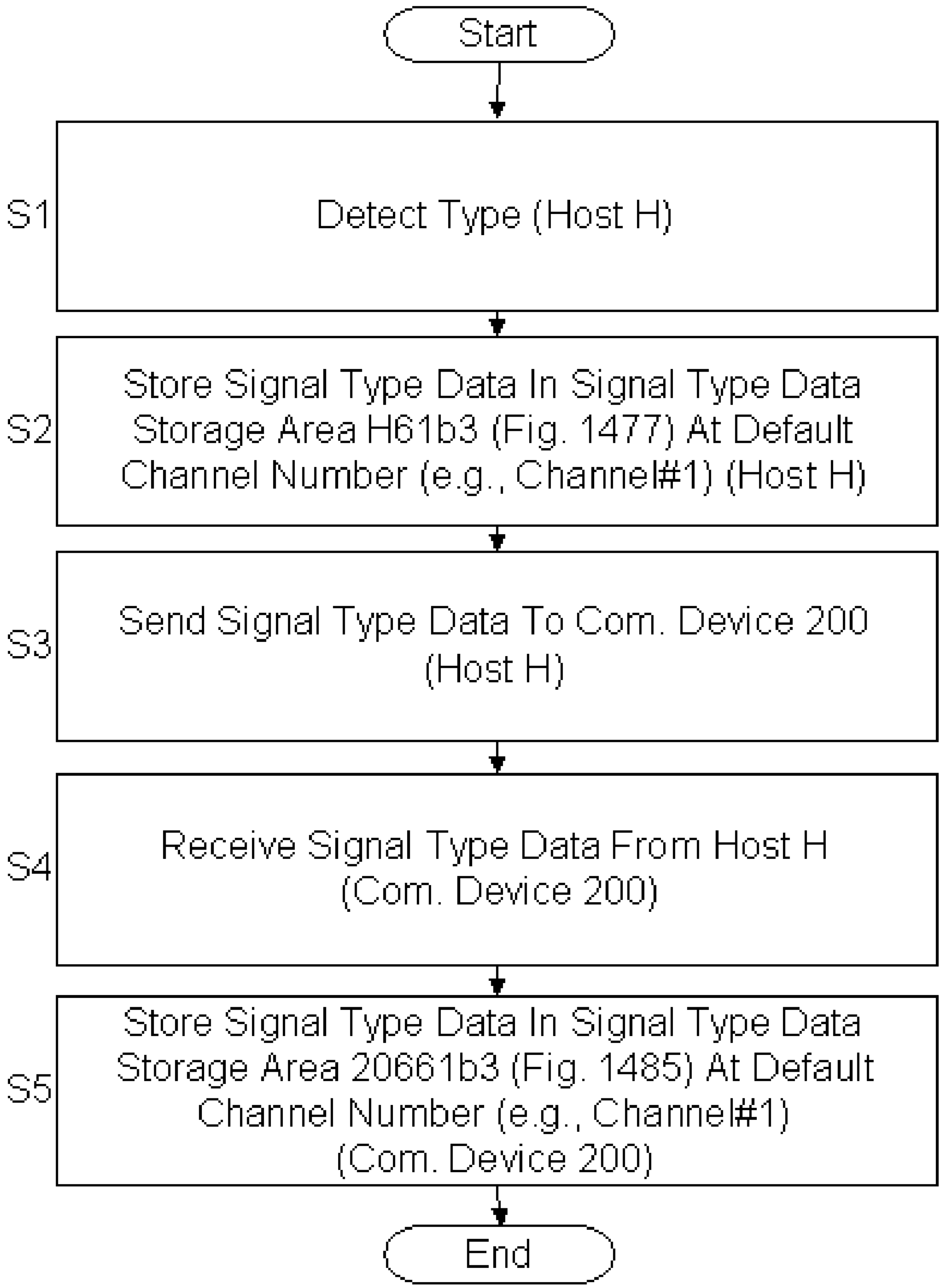

Fig. 1489
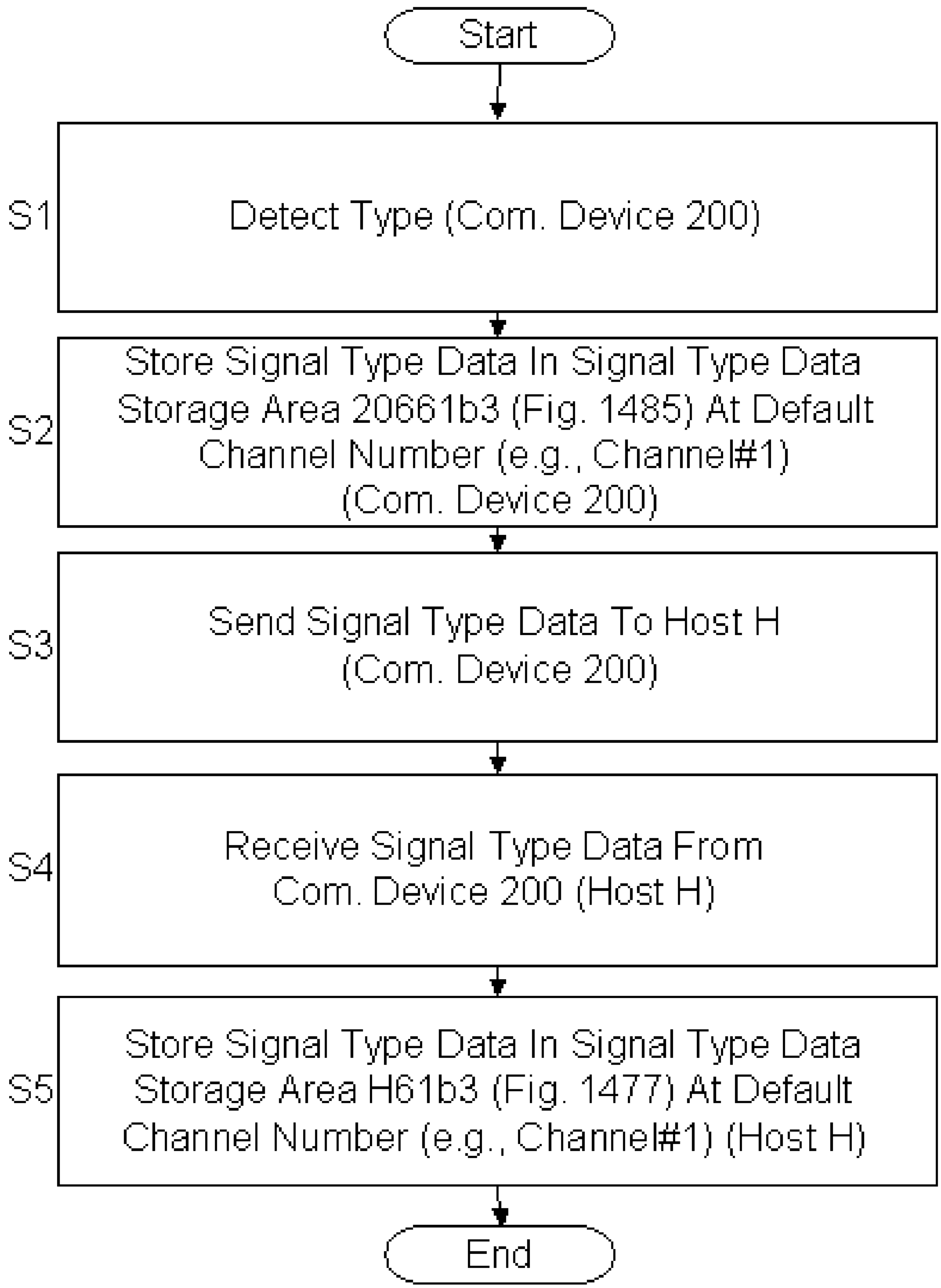

Fig. 1490
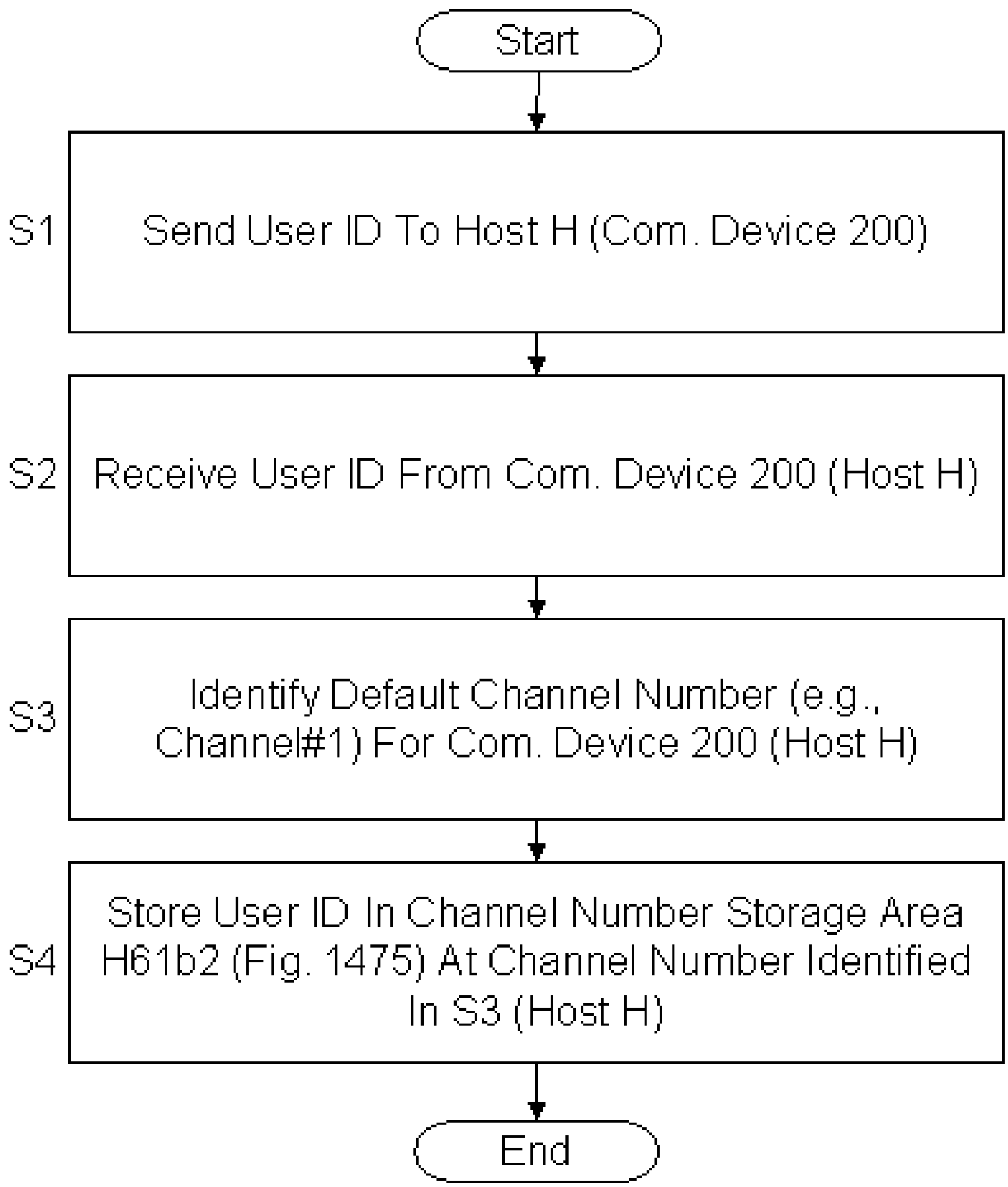

Fig. 1491
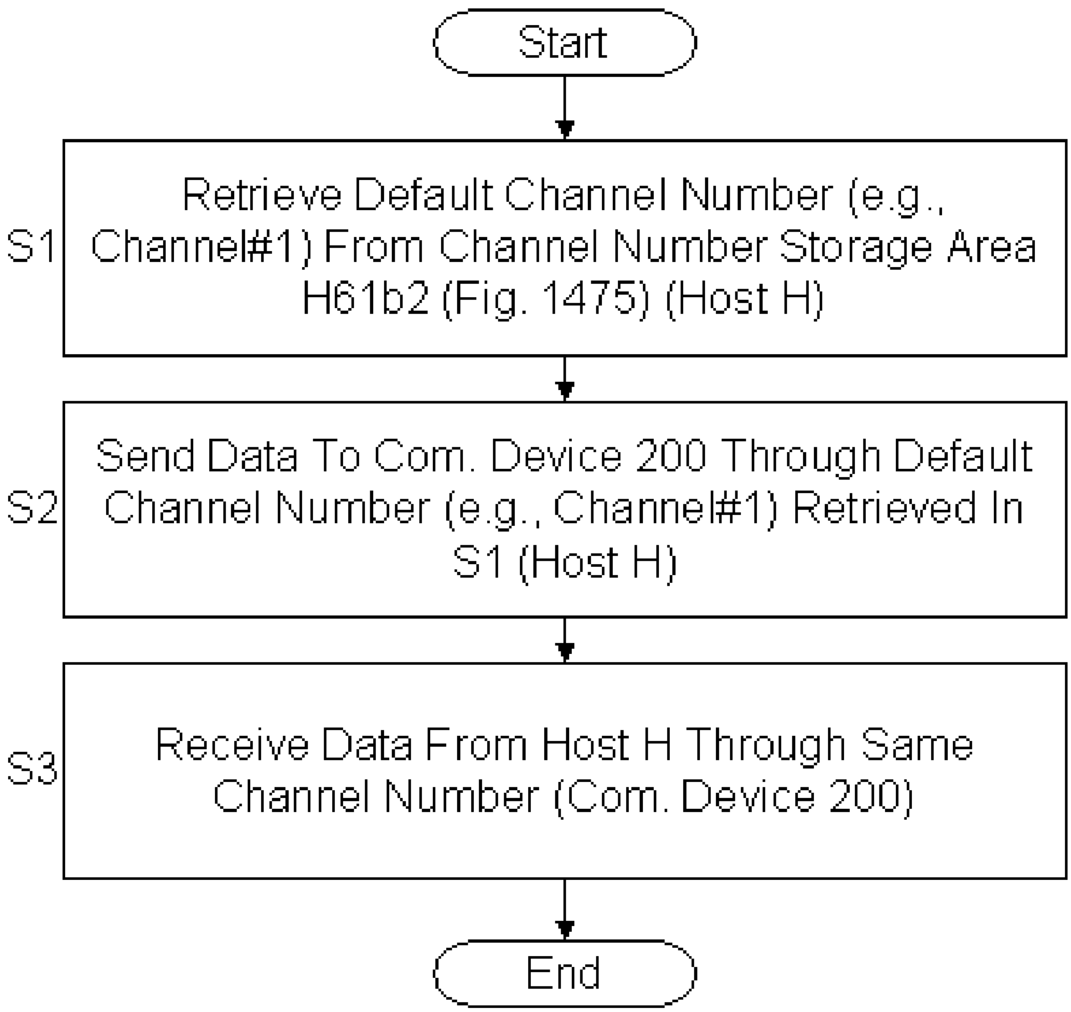

Fig. 1492
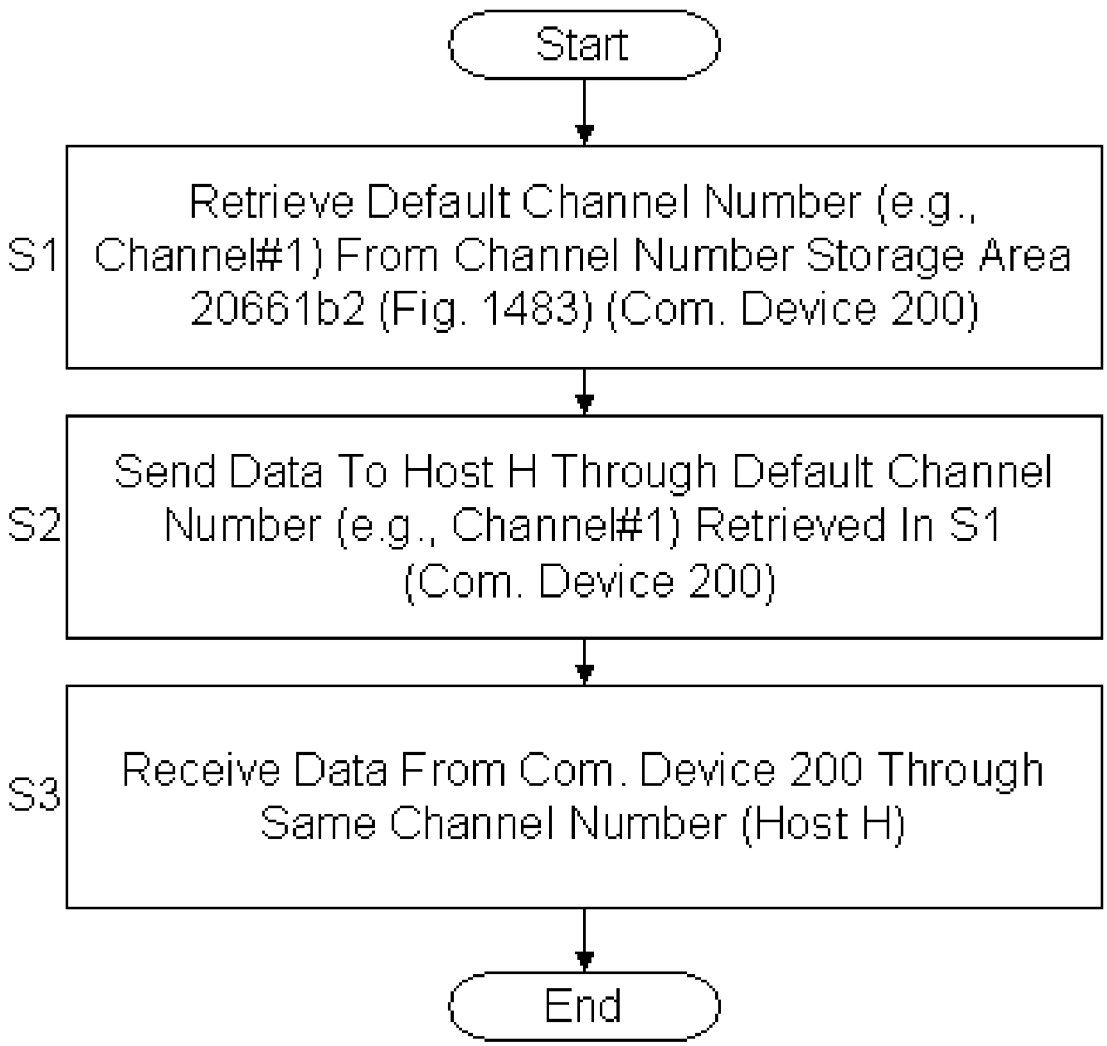

Fig. 1493
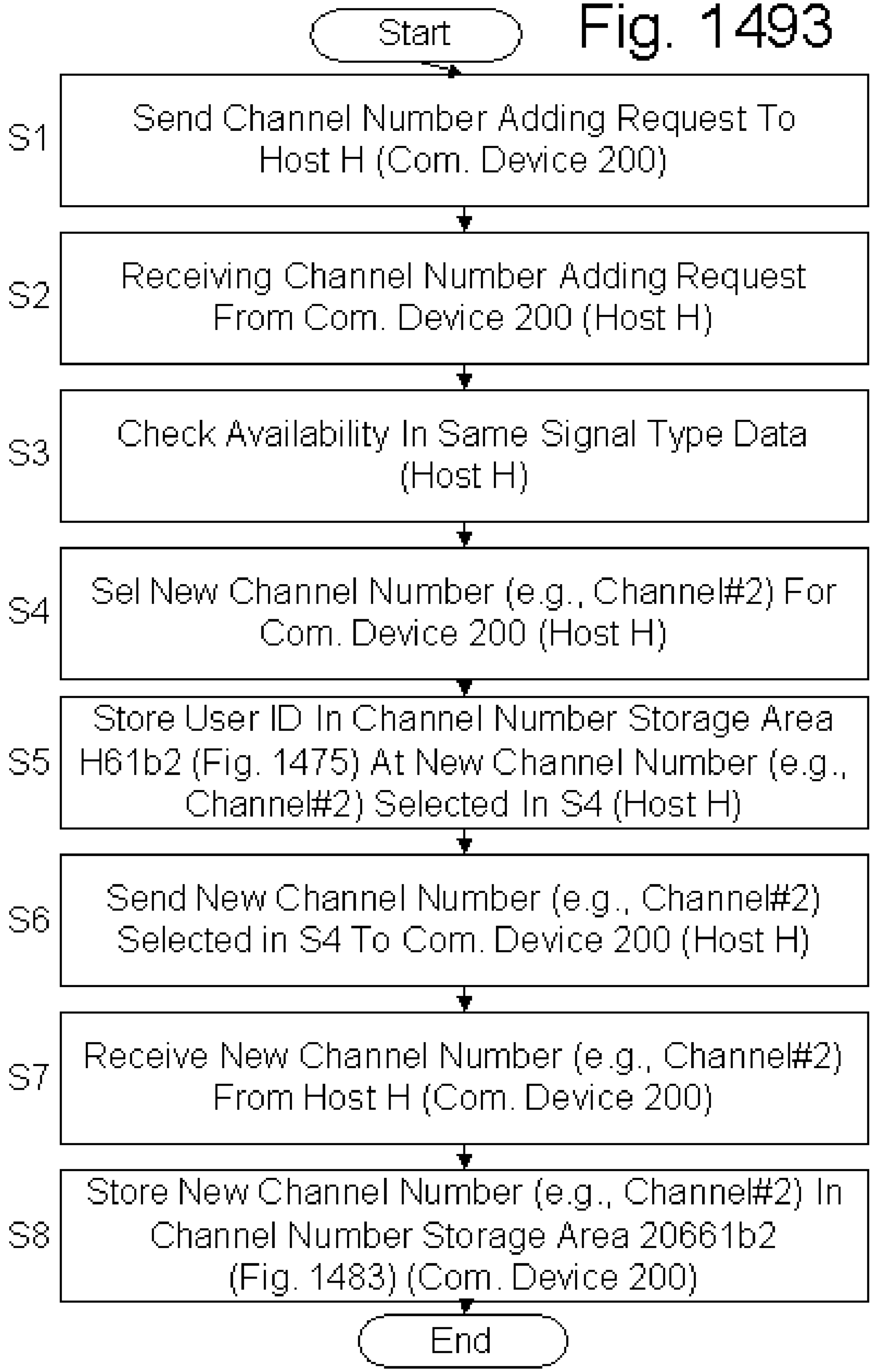

Fig. 1494
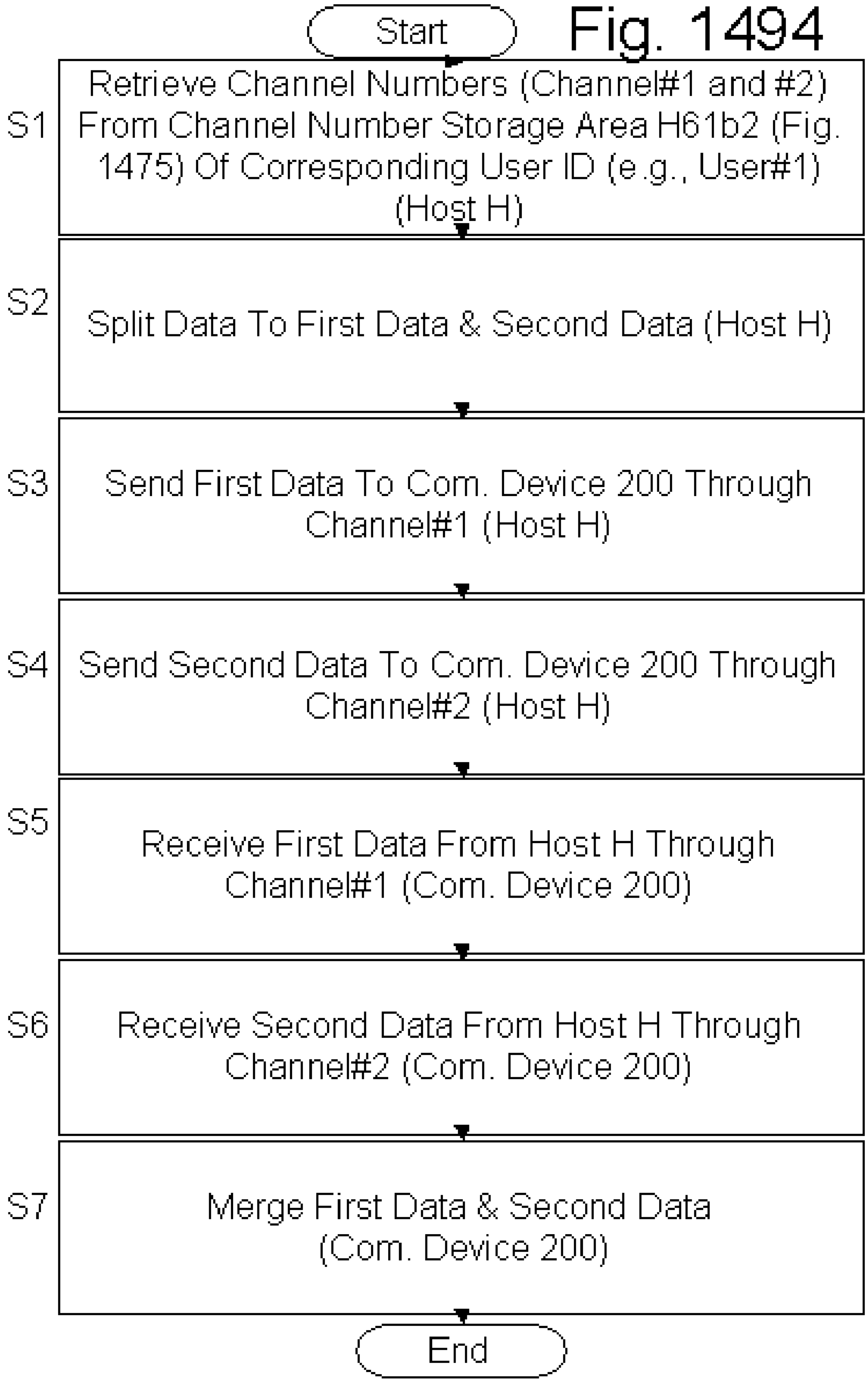

Fig. 1495
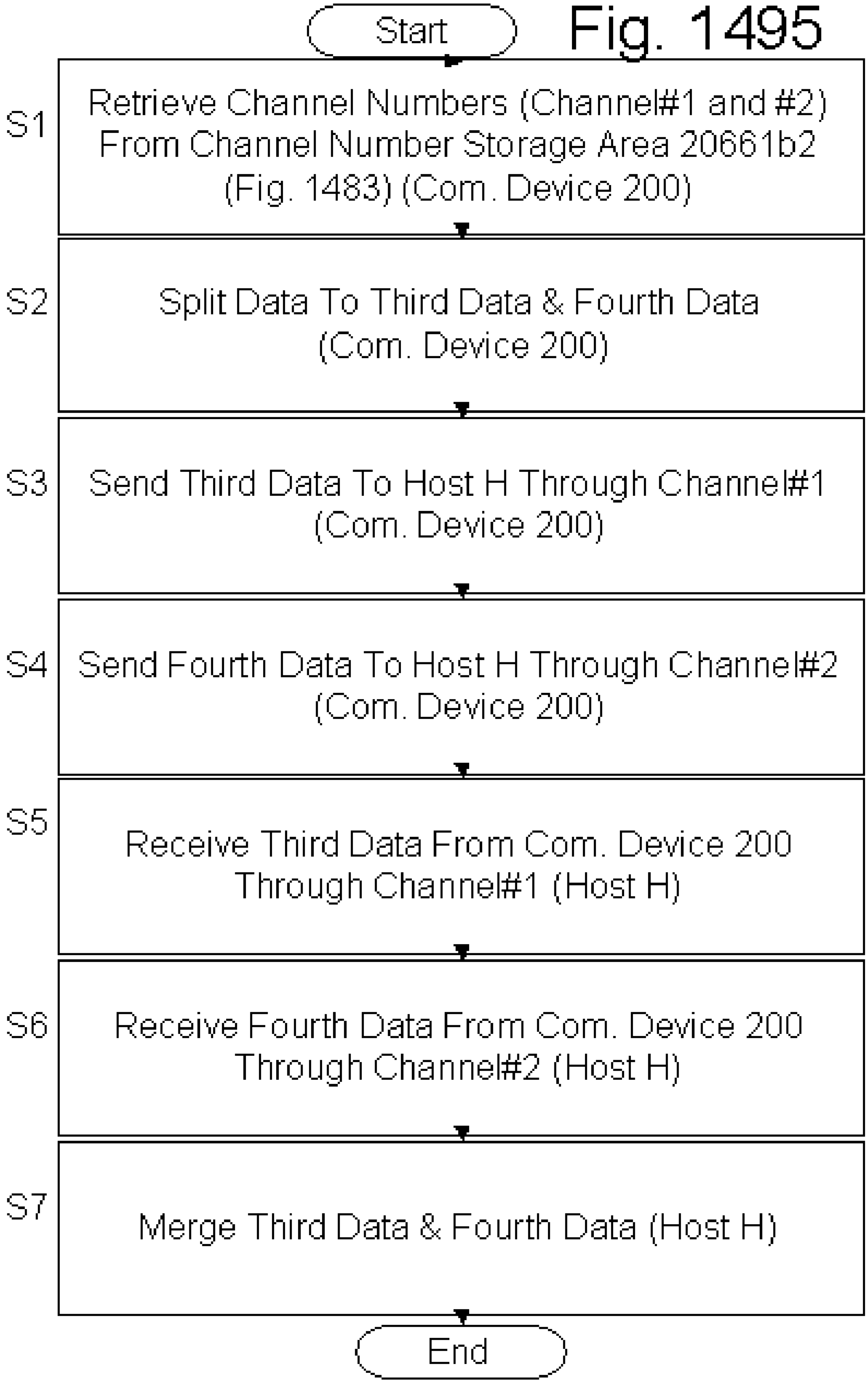

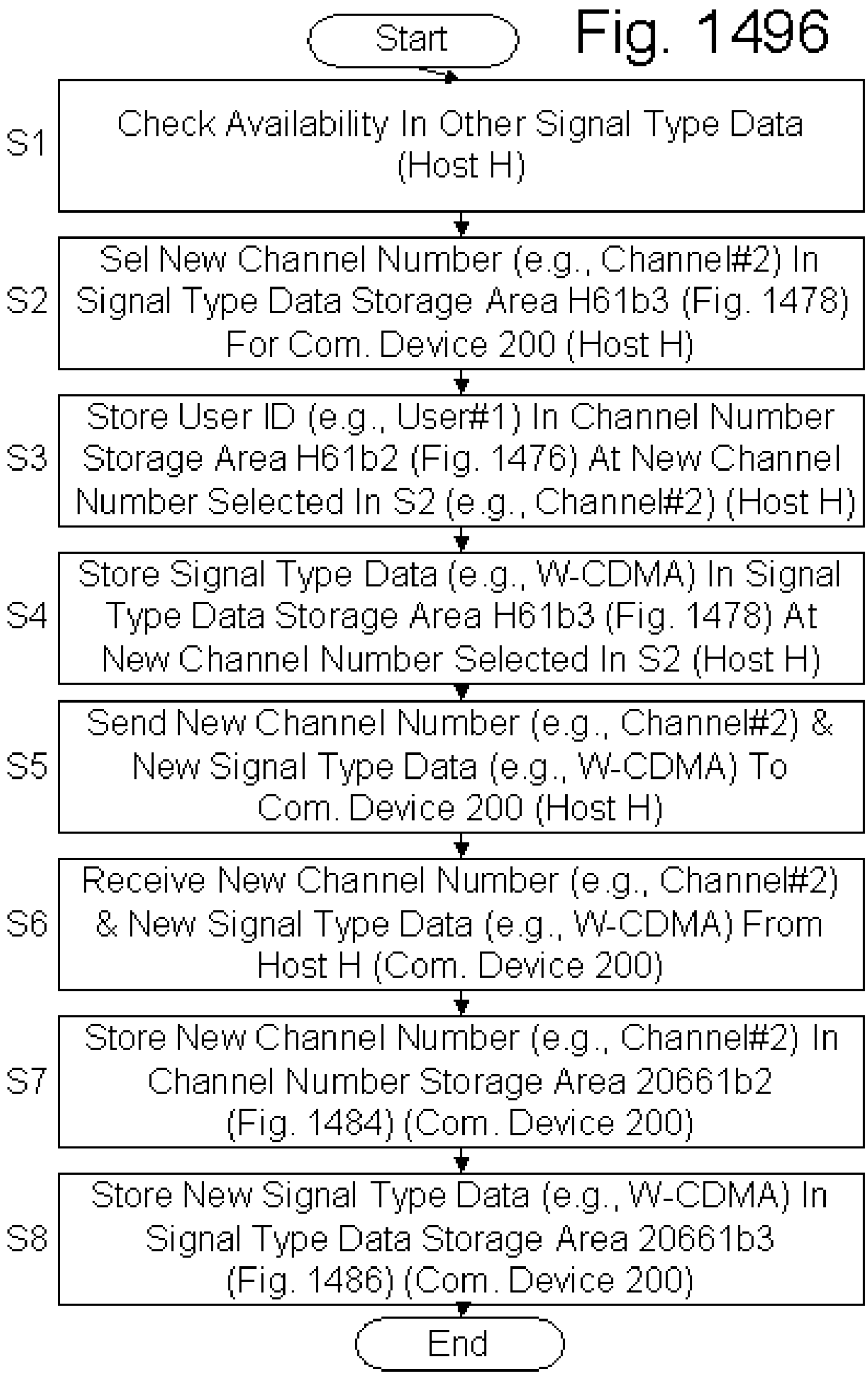
Fig. 1496
Start
S1
Check Availability In Other Signal Type Data (Host H)
S2
Sel New Channel Number (e.g., Channel#2) In Signal Type Data Storage Area H61b3 (Fig. 1478) For Com. Device 200 (Host H)
S3
Store User ID (e.g., User#1) In Channel Number Storage Area H61b2 (Fig. 1476) At New Channel Number Selected In S2 (e.g., Channel#2) (Host H)
S4
Store Signal Type Data (e.g., W-CDMA) In Signal Type Data Storage Area H61b3 (Fig. 1478) At New Channel Number Selected In S2 (Host H)
S5
Send New Channel Number (e.g., Channel#2) & New Signal Type Data (e.g., W-CDMA) To Com. Device 200 (Host H)
S6
Receive New Channel Number (e.g., Channel#2) & New Signal Type Data (e.g., W-CDMA) From Host H (Com. Device 200)
S7
Store New Channel Number (e.g., Channel#2) In Channel Number Storage Area 20661b2 (Fig. 1484) (Com. Device 200)
S8
Store New Signal Type Data (e.g., W-CDMA) In Signal Type Data Storage Area 20661b3 (Fig. 1486) (Com. Device 200)
End Fig. 1497
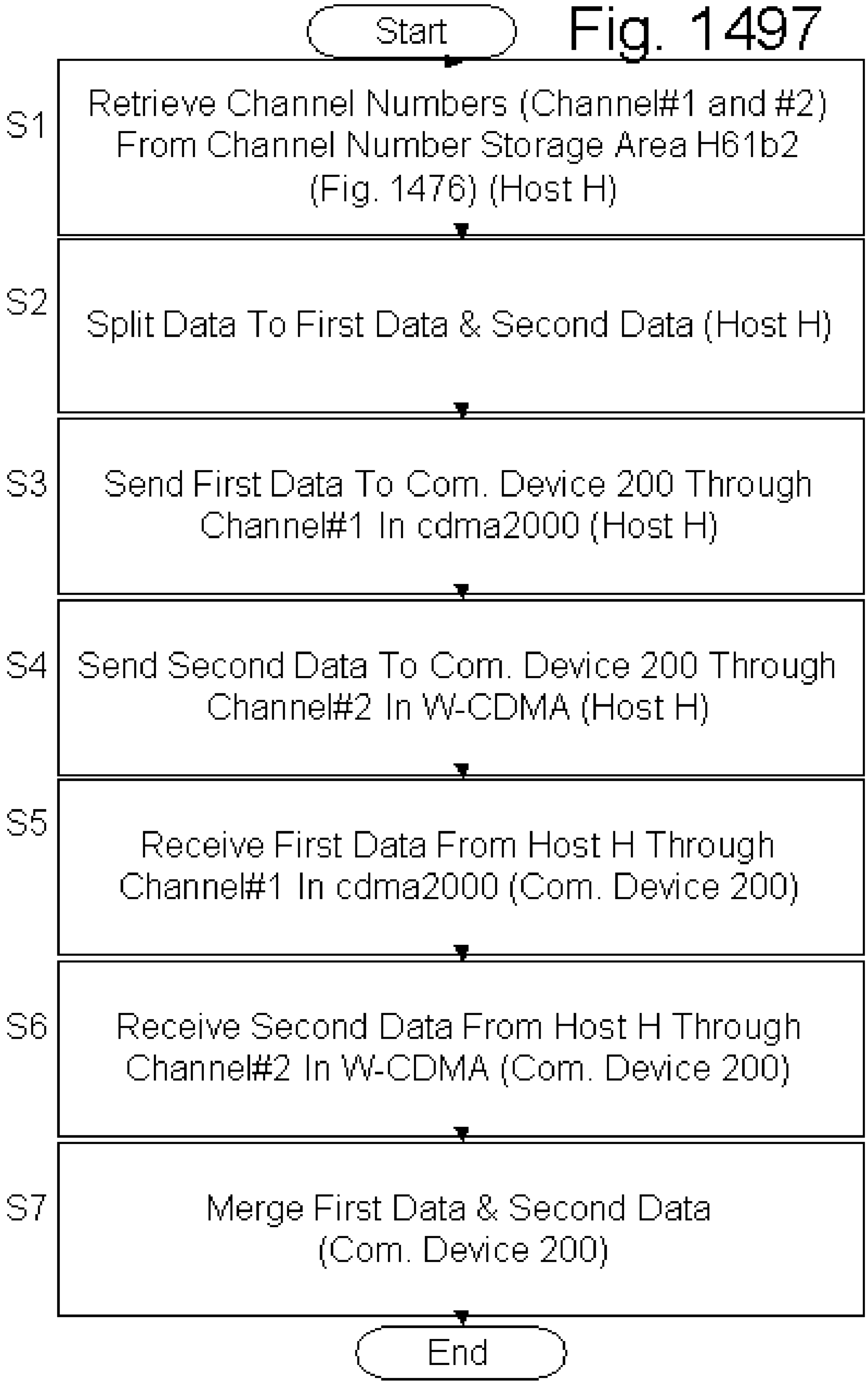

Fig. 1498
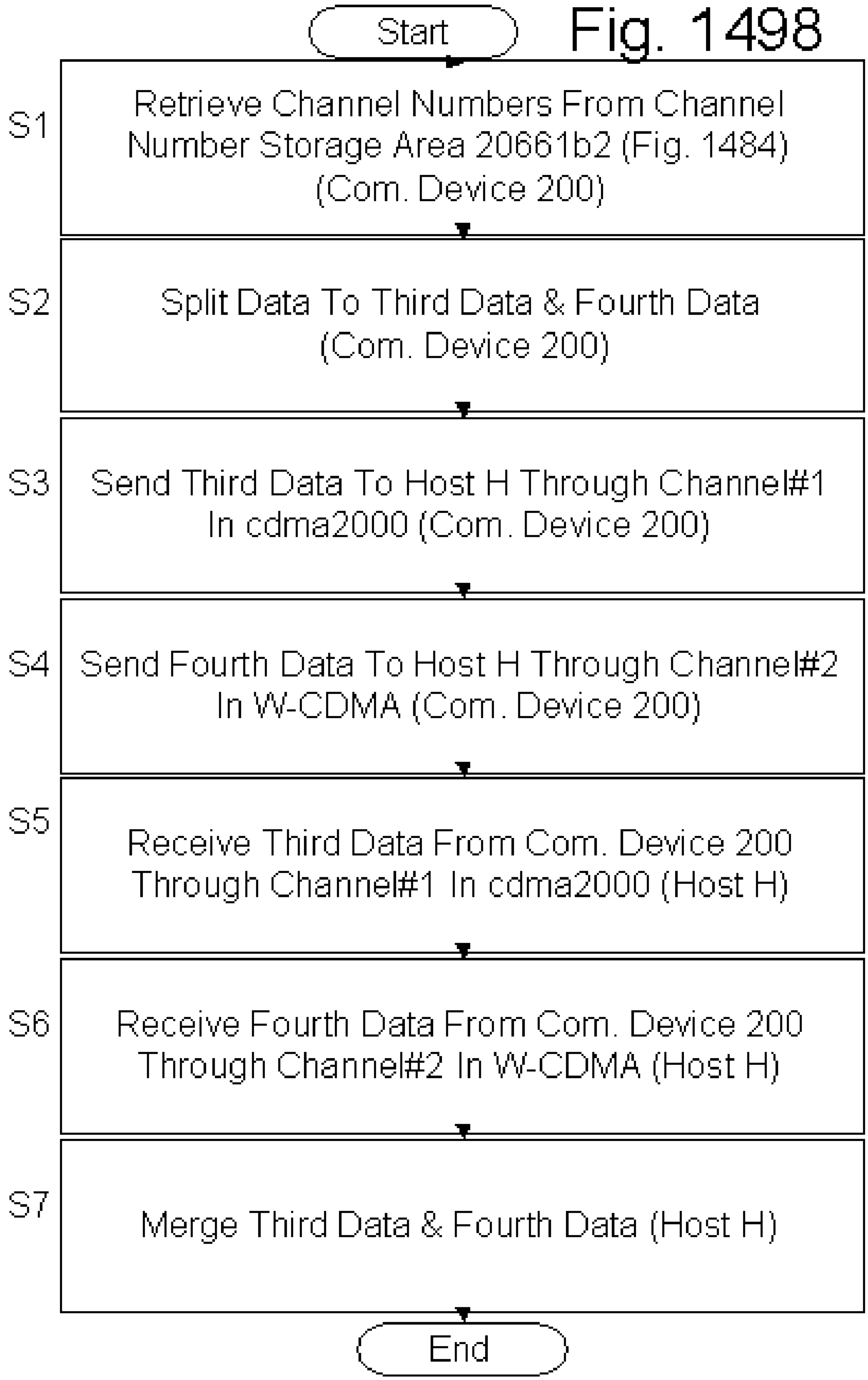

Fig. 1499
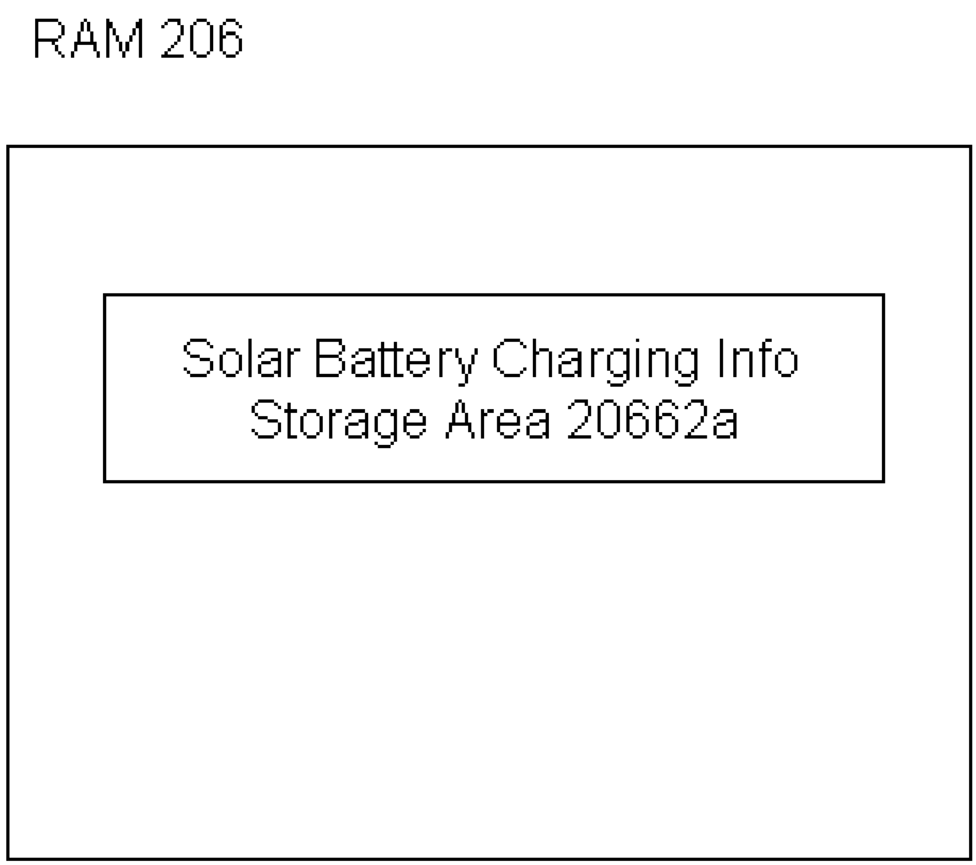

Fig. 1500
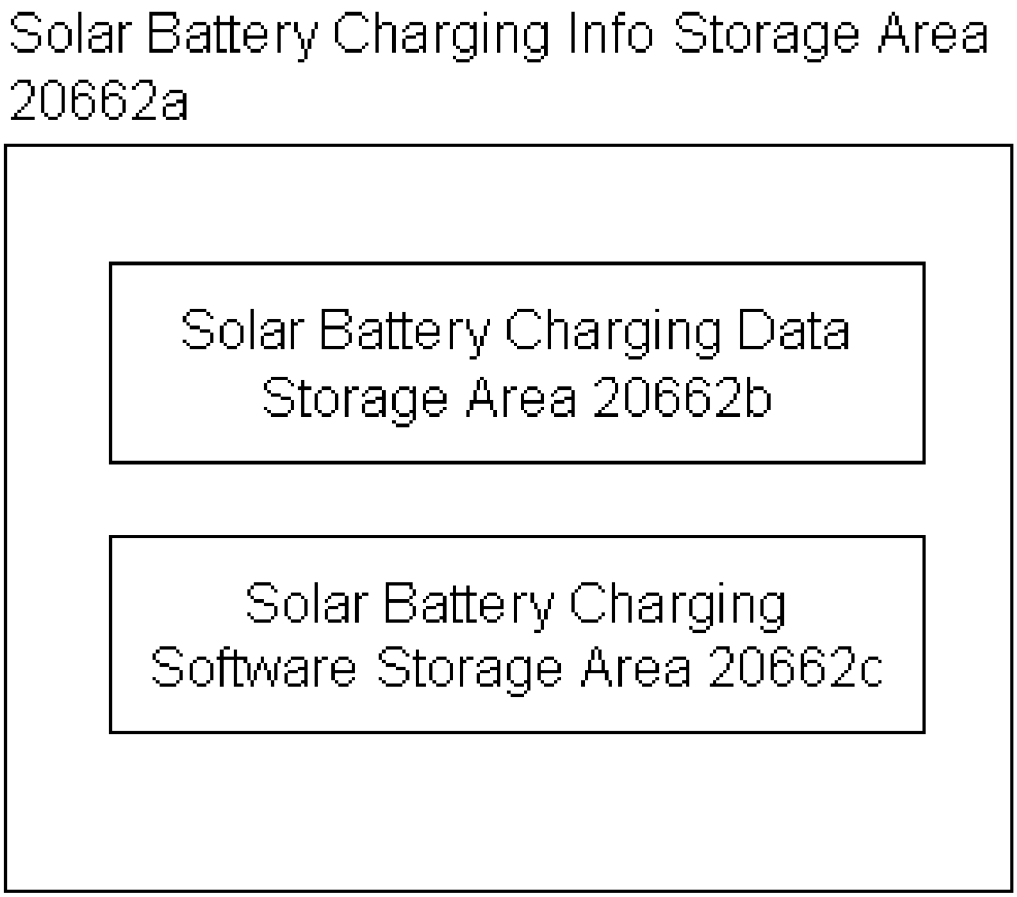

Fig. 1501
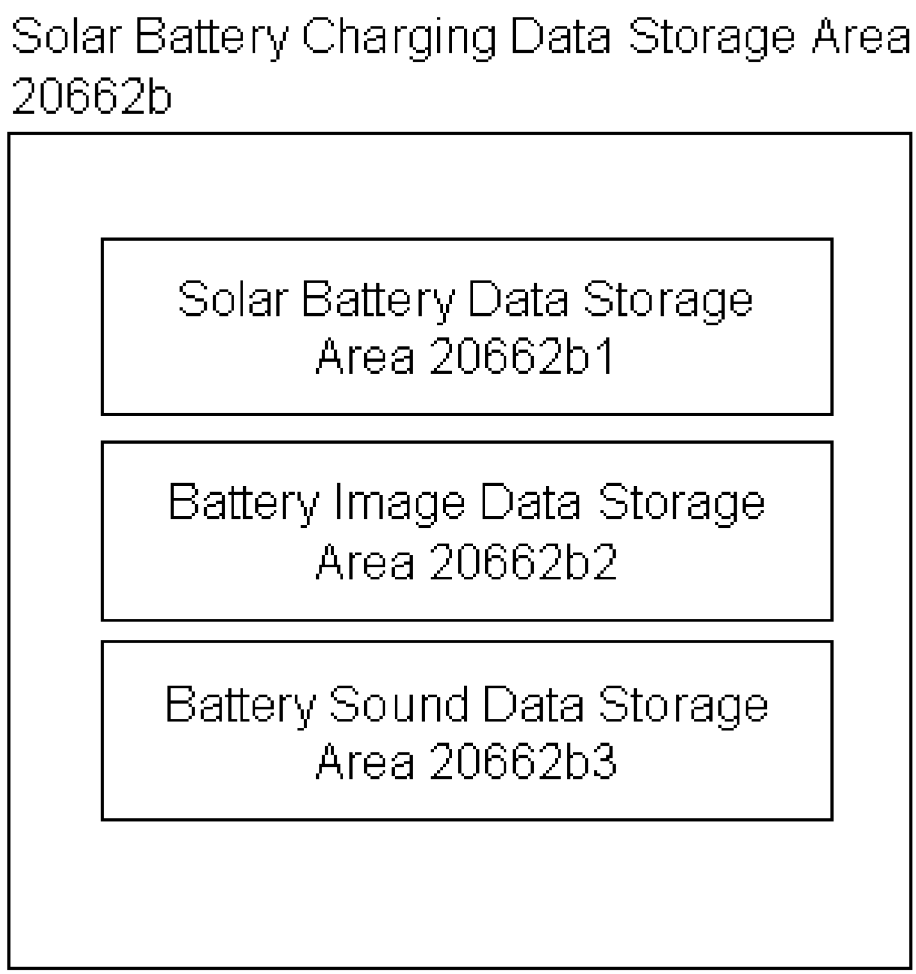

Fig. 1502
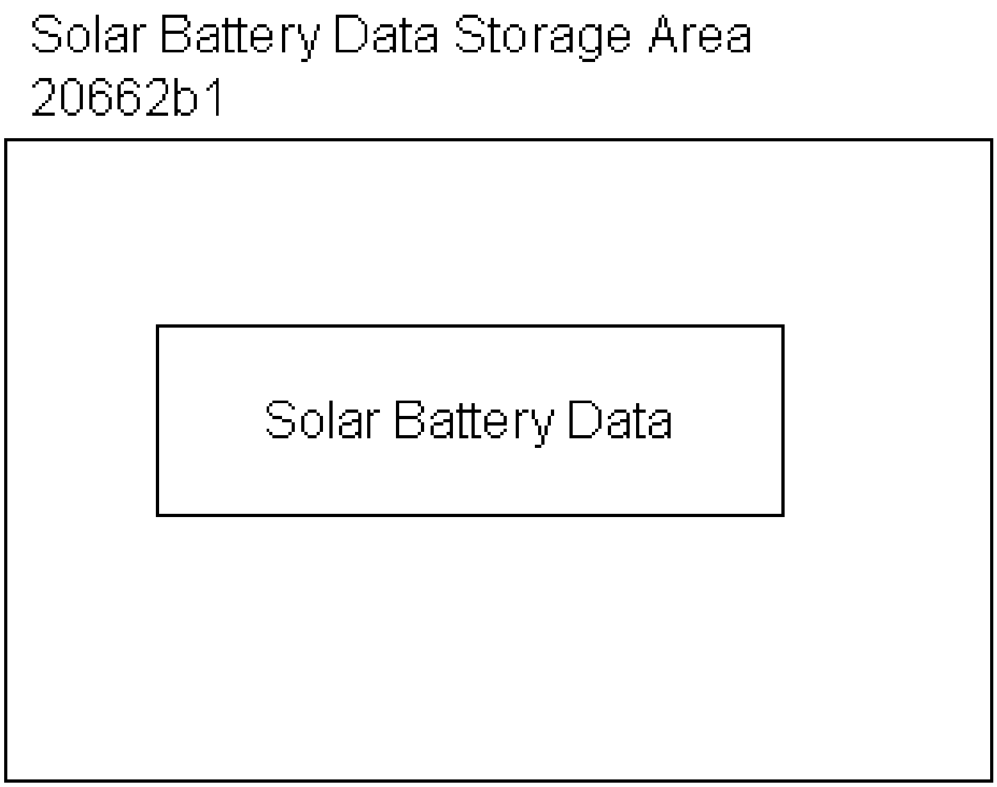

Fig. 1503

Battery Image Data Storage Area
20662b2

| Battery Image ID | Battery Image Data |
|---|---|
| Battery Image#1 | Battery Image Data#1 |
| Battery Image#2 | Battery Image Data#2 |
| Battery Image#3 | Battery Image Data#3 |
| Battery Image#4 | Battery Image Data#4 |
| Battery Image#5 | Battery Image Data#5 |

Fig. 1504

Battery Sound Data Storage Area
20662b3

| Battery Sound ID | Battery Sound Data |
|---|---|
| Battery Sound#1 | Battery Sound Data#1 |
| Battery Sound#2 | Battery Sound Data#2 |
| Battery Sound#3 | Battery Sound Data#3 |
| Battery Sound#4 | Battery Sound Data#4 |

Fig. 1505
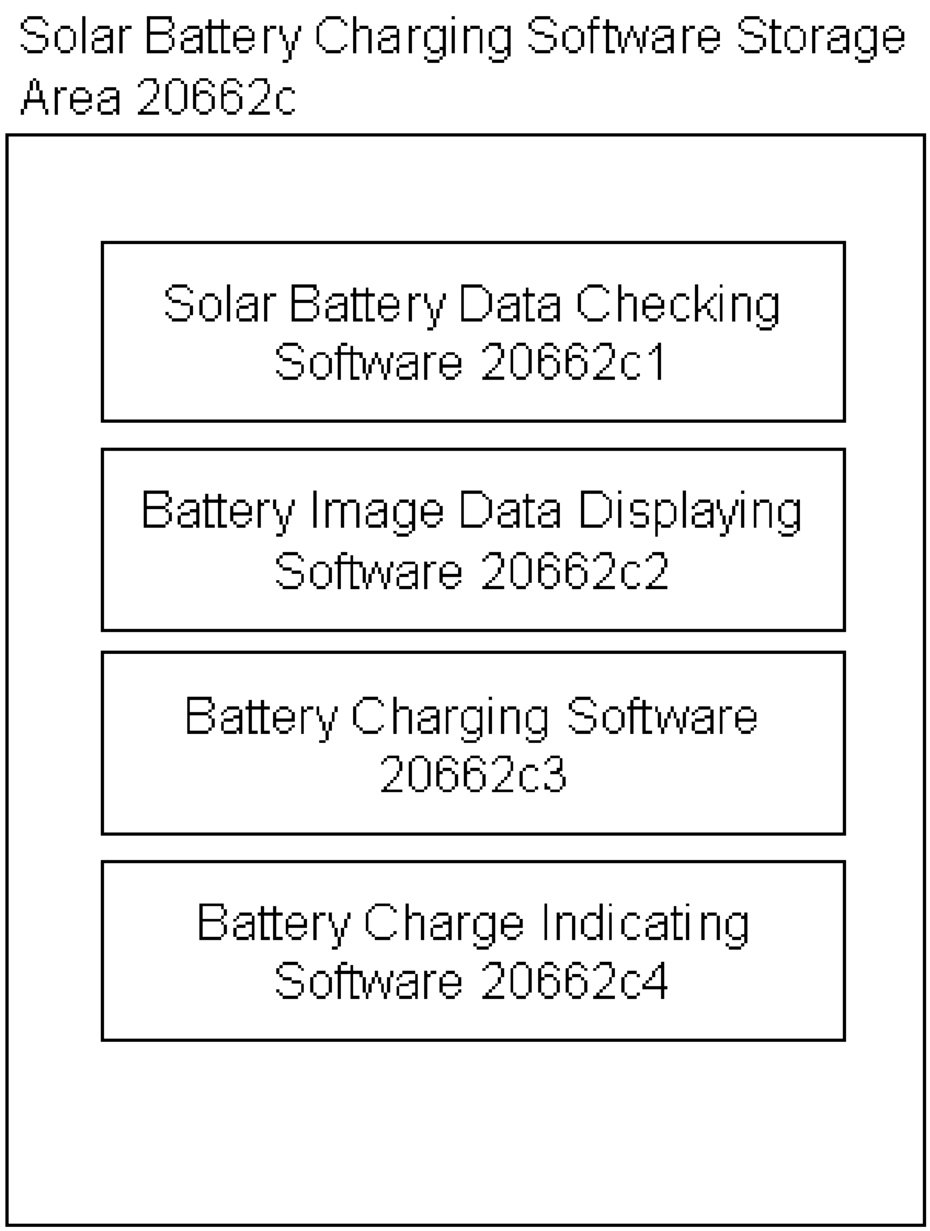

Fig. 1506
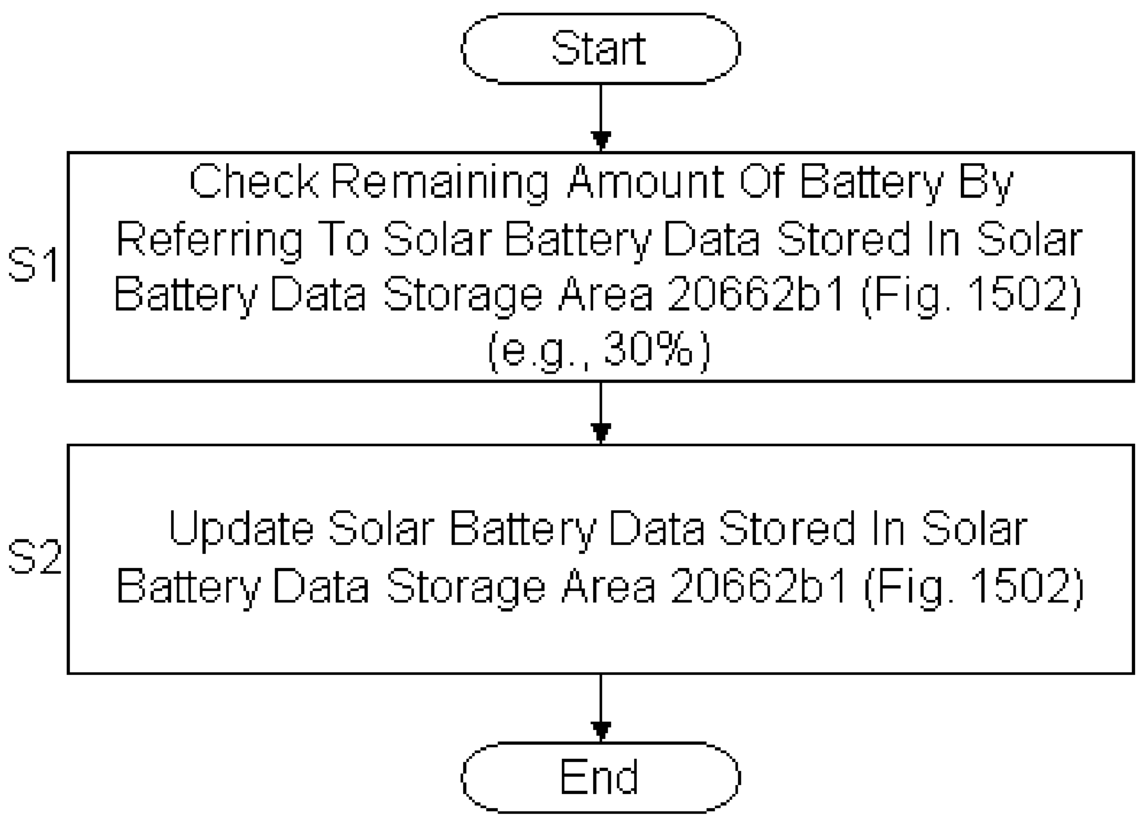

Fig. 1507
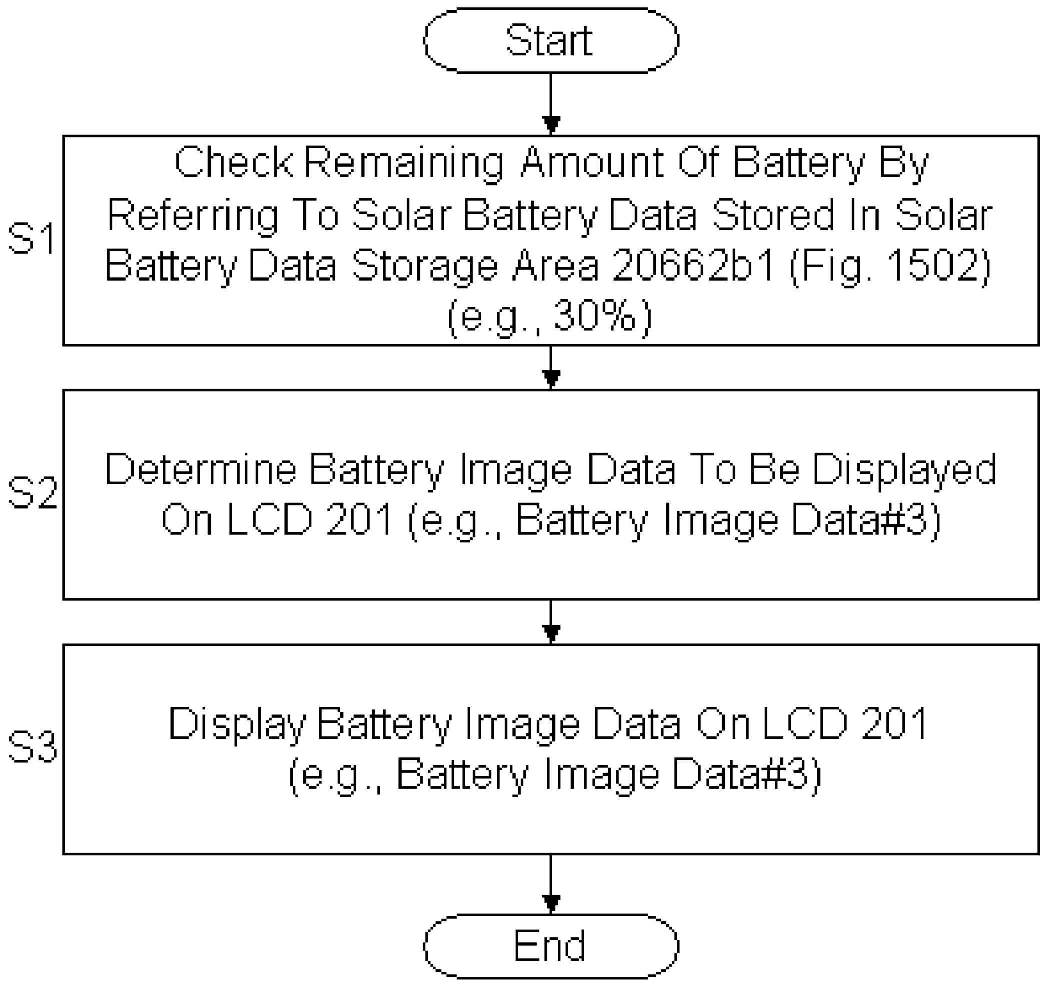

Fig. 1508
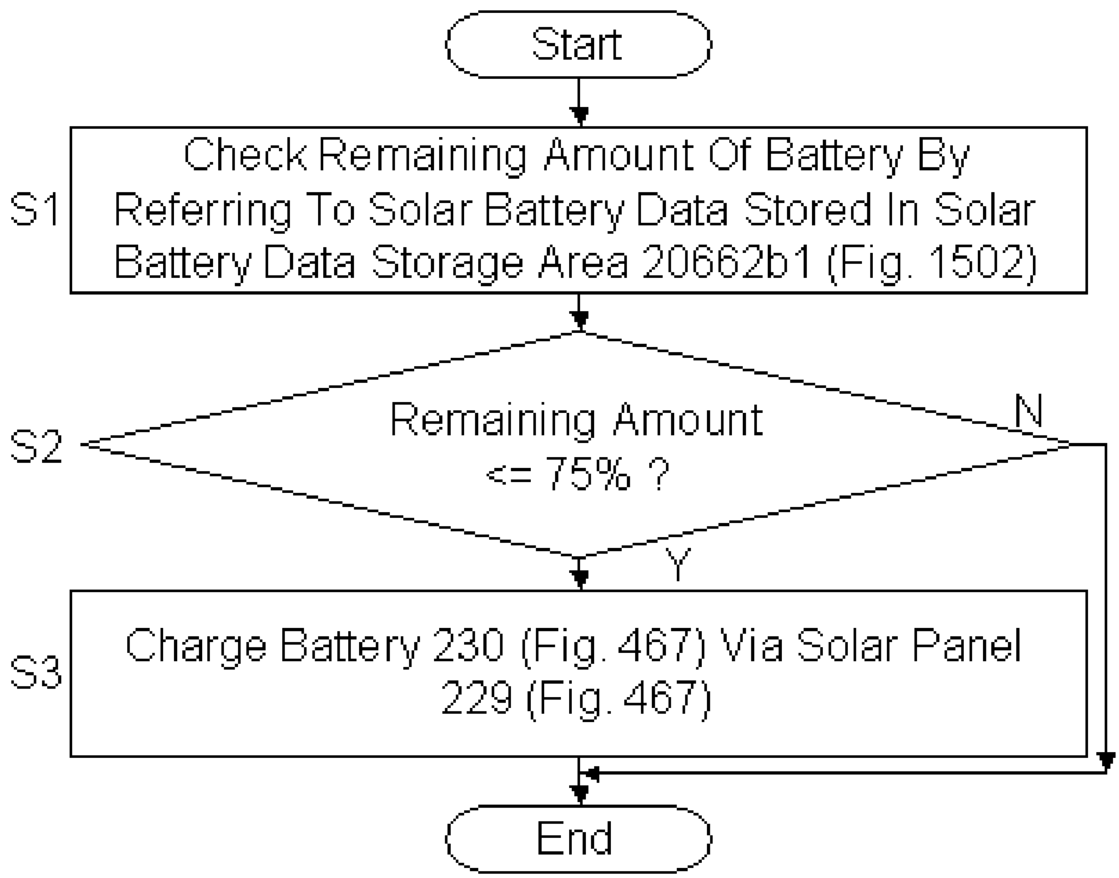

Fig. 1509
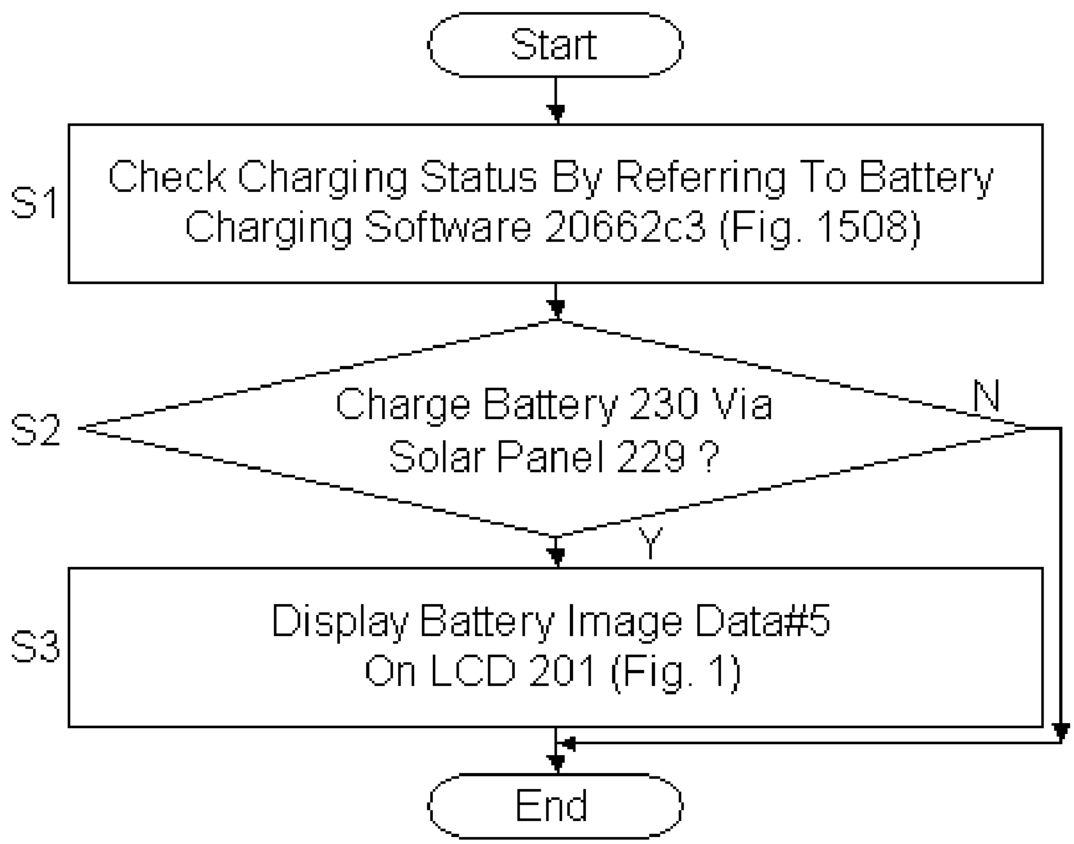

Fig. 1510
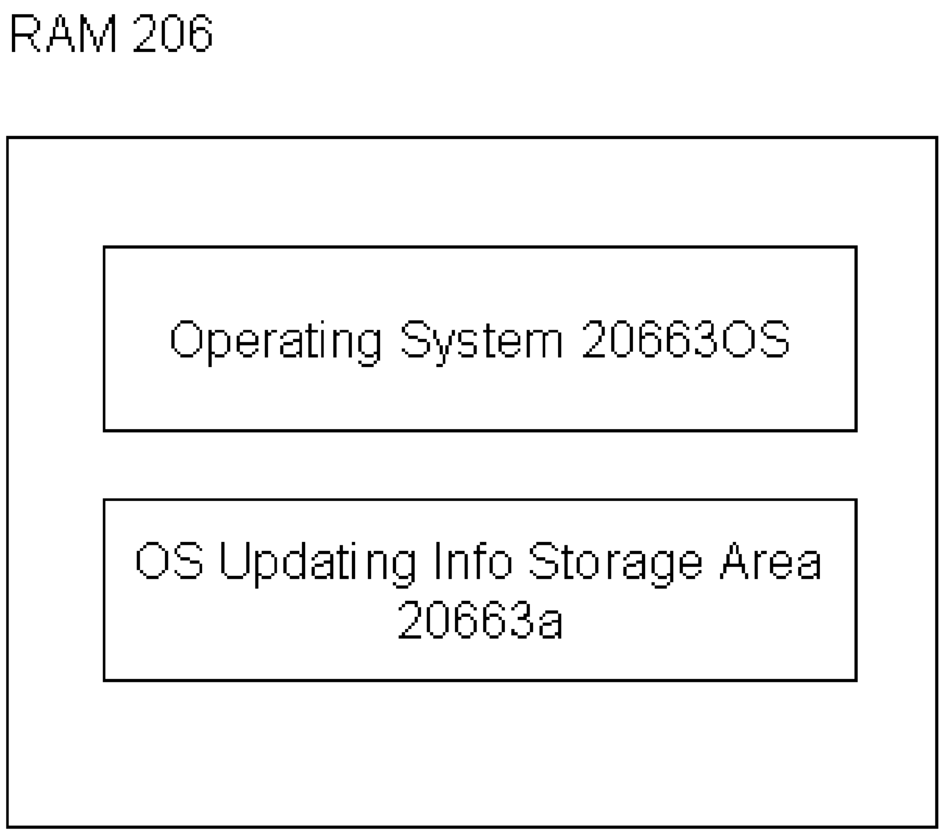

Fig. 1511

Operating System 20663OS

Battery Controller 20663OSa
CCD Unit Controller 20663OSb
Flash Light Unit Controller 20663OSc
Indicator Controller 20663OSd
Input Device Controller 20663OSe
LCD Controller 20663OSf
LED Controller 20663OSg
Memory Card Interface Controller 20663OSh
Microphone Controller 20663OSi
Photometer Controller 20663OSj
RAM Controller 20663OSk
ROM Controller 20663OSl

Fig. 1512

Operating System 20663OS (cont.)

Signal Processor Controller 20663OSm
Signal Processor Controller 20663OSn
Solar Panel Controller 20663OSo
Speaker Controller 20663OSp
Vibrator Controller 20663OSq
Video Processor Controller 20663OSr
Wireless Receiver Controller 20663OSs
Wireless Receiver Controller 20663OSt
Wireless Receiver Controller 20663OSu
Wireless Transmitter Controller 20663OSv
Wireless Transmitter Controller 20663OSw
Wireless Transmitter Controller 20663OSx Fig. 1513
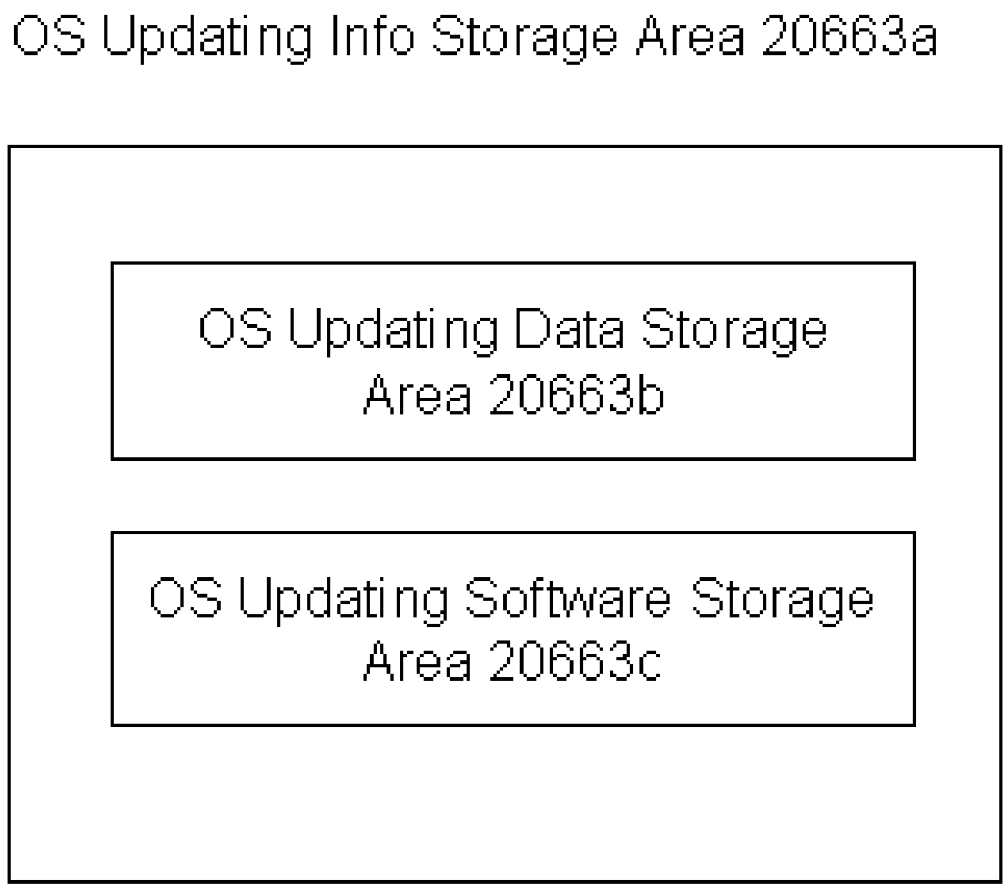

Fig. 1514
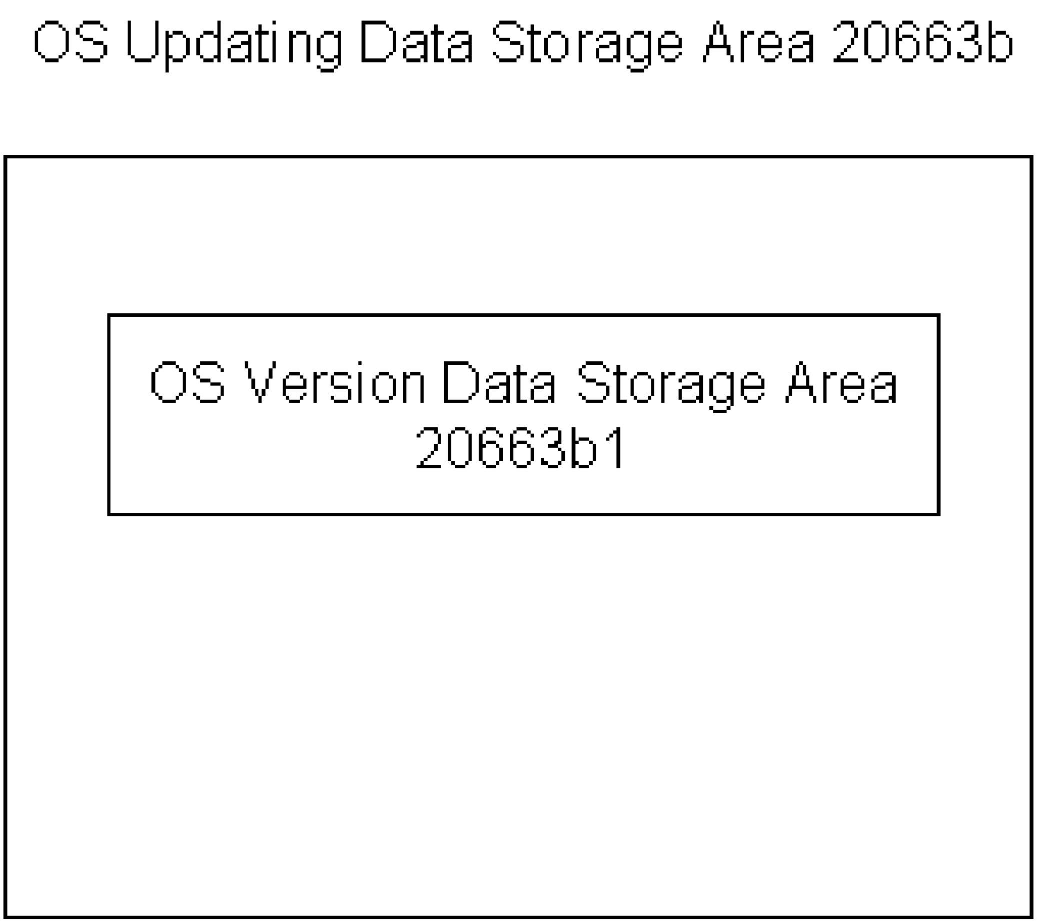

Fig. 1515

OS Version Data Storage Area 20663b1

| |
|---|
| Battery Controller Version Data 20663b1a |
| CCD Unit Controller Version Data 20663b1b |
| Flash Light Unit Controller Version Data 20663b1c |
| Indicator Controller Version Data 20663b1d |
| Input Device Controller Version Data 20663b1e |
| LCD Controller Version Data 20663b1f |
| LED Controller Version Data 20663b1g |
| Memory Card Interface Controller Version Data 20663b1h |
| Microphone Controller Version Data 20663b1i |
| Photometer Controller Version Data 20663b1j |
| RAM Controller Version Data 20663b1k |
| ROM Controller Version Data 20663b1l |

Fig. 1516

OS Version Data Storage Area 20663b1 (cont.)

| |
|---|
| Signal Processor Controller Version Data 20663b1m |
| Signal Processor Controller Version Data 20663b1n |
| Solar Panel Controller Version Data 20663b1o |
| Speaker Controller Version Data 20663b1p |
| Vibrator Controller Version Data 20663b1q |
| Video Processor Controller Version Data 20663b1r |
| Wireless Receiver Controller Version Data 20663b1s |
| Wireless Receiver Controller Version Data 20663b1t |
| Wireless Receiver Controller Version Data 20663b1u |
| Wireless Transmitter Controller Version Data 20663b1v |
| Wireless Transmitter Controller Version Data 20663b1w |
| Wireless Transmitter Controller Version Data 20663b1x |

Fig. 1517

OS Updating Software Storage Area 20663c

| |
|---|
| Battery Controller Updating Software 20663c1a |
| CCD Unit Controller Updating Software 20663c1b |
| Flash Light Unit Controller Updating Software 20663c1c |
| Indicator Controller Updating Software 20663c1d |
| Input Device Controller Updating Software 20663c1e |
| LCD Controller Updating Software 20663c1f |
| LED Controller Updating Software 20663c1g |
| Memory Card Interface Controller Updating Software 20663c1h |
| Microphone Controller Updating Software 20663c1i |
| Photometer Controller Updating Software 20663c1j |
| RAM Controller Updating Software 20663c1k |
| ROM Controller Updating Software 20663c1l |

Fig. 1518

OS Updating Software Storage Area
20663c (cont.)

Signal Processor Controller Updating Software 20663c1m
Signal Processor Controller Updating Software 20663c1n
Solar Panel Controller Updating Software 20663c1o
Speaker Controller Updating Software 20663c1p
Vibrator Controller Updating Software 20663c1q
Video Processor Controller Updating Software 20663c1r
Wireless Receiver Controller Updating Software 20663c1s
Wireless Receiver Controller Updating Software 20663c1t
Wireless Receiver Controller Updating Software 20663c1u
Wireless Transmitter Controller Updating Software 20663c1v
Wireless Transmitter Controller Updating Software 20663c1w
Wireless Transmitter Controller Updating Software 20663c1x Fig. 1519
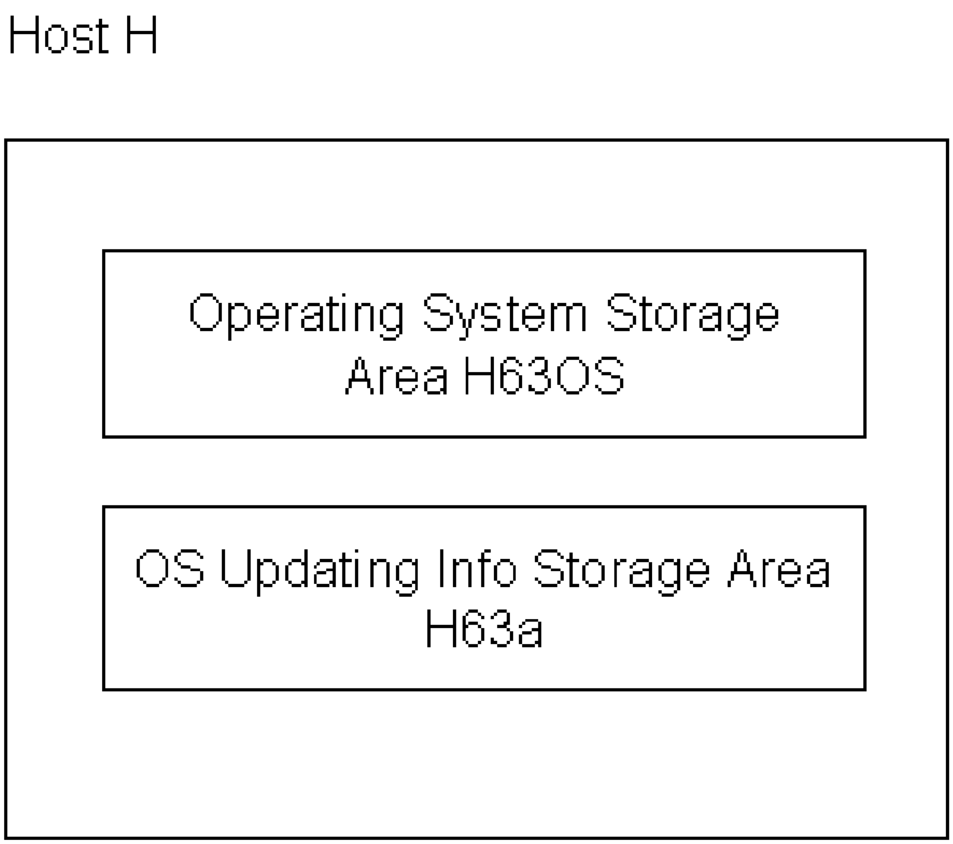

Fig. 1520

Operating System Storage Area H63OS

Battery Controller H63OSa
CCD Unit Controller H63OSb
Flash Light Unit Controller H63OSc
Indicator Controller H63OSd
Input Device Controller H63OSe
LCD Controller H63OSf
LED Controller H63OSg
Memory Card Interface Controller H63OSh
Microphone Controller H63OSi
Photometer Controller H63OSj
RAM Controller H63OSk
ROM Controller H63OSl

Fig. 1521

Operating System Storage Area H63OS (cont.)

| |
|---|
| Signal Processor Controller H63OSm |
| Signal Processor Controller H63OSn |
| Solar Panel Controller H63OSo |
| Speaker Controller H63OSp |
| Vibrator Controller H63OSq |
| Video Processor Controller H63OSr |
| Wireless Receiver Controller H63OSs |
| Wireless Receiver Controller H63OSt |
| Wireless Receiver Controller H63OSu |
| Wireless Transmitter Controller H63OSv |
| Wireless Transmitter Controller H63OSw |
| Wireless Transmitter Controller H63OSx |

Fig. 1522
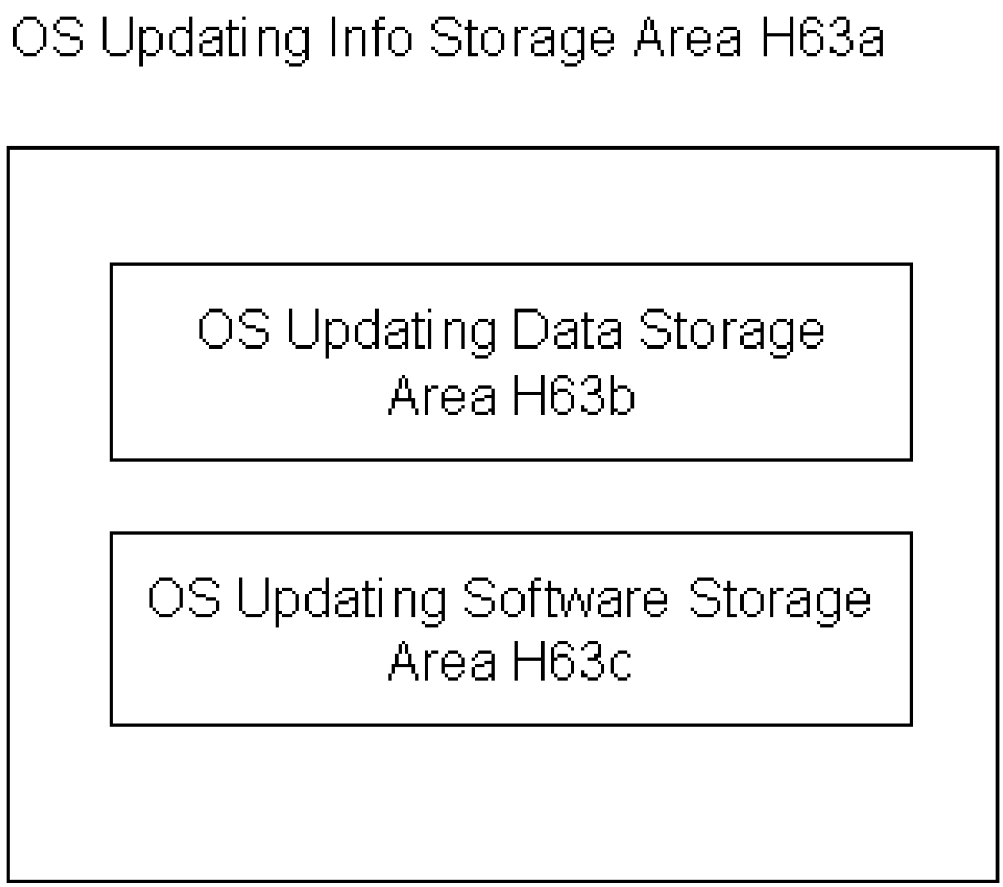

Fig. 1523
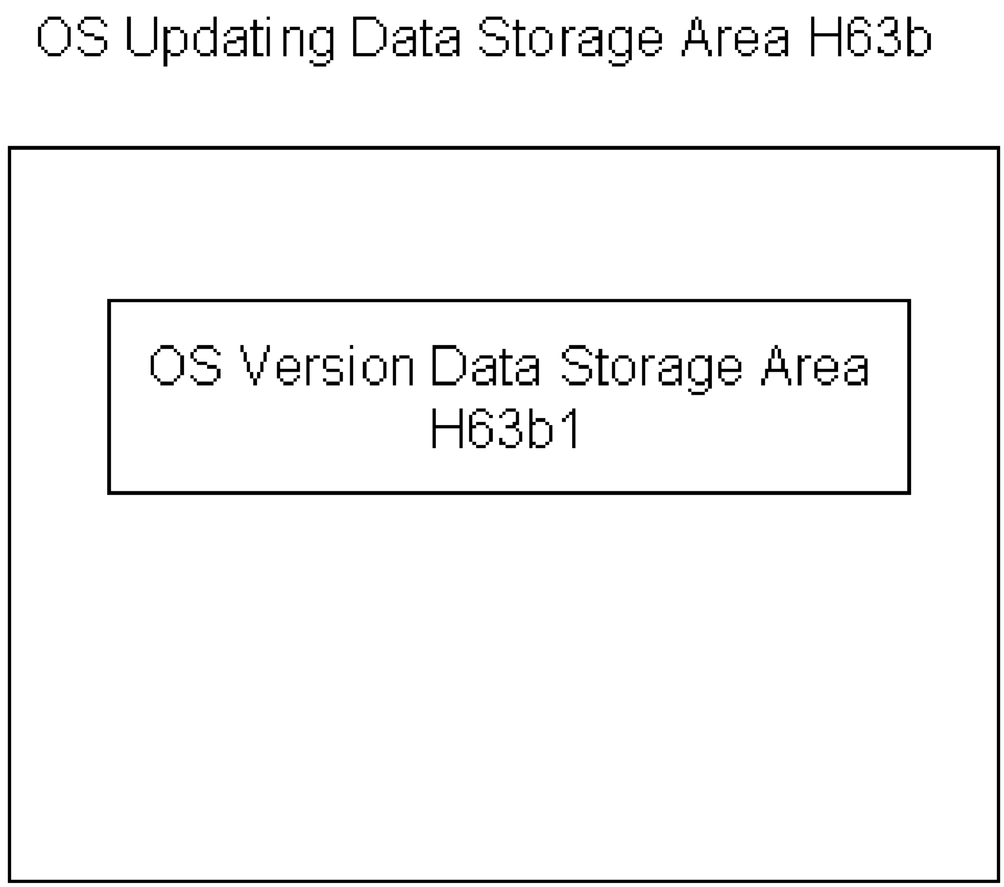

Fig. 1524

OS Version Data Storage Area H63b1

| |
|---|
| Battery Controller Version Data H63b1a<br>CCD Unit Controller Version Data H63b1b<br>Flash Light Unit Controller Version Data H63b1c<br>Indicator Controller Version Data H63b1d<br>Input Device Controller Version Data H63b1e<br>LCD Controller Version Data H63b1f<br>LED Controller Version Data H63b1g<br>Memory Card Interface Controller Version Data H63b1h<br>Microphone Controller Version Data H63b1i<br>Photometer Controller Version Data H63b1j<br>RAM Controller Version Data H63b1k<br>ROM Controller Version Data H63b1l |

Fig. 1525

OS Version Data Storage Area H63b1
(cont.)

Signal Processor Controller Version Data H63b1m
Signal Processor Controller Version Data H63b1n
Solar Panel Controller Version Data H63b1o
Speaker Controller Version Data H63b1p
Vibrator Controller Version Data H63b1q
Video Processor Controller Version Data H63b1r
Wireless Receiver Controller Version Data H63b1s
Wireless Receiver Controller Version Data H63b1t
Wireless Receiver Controller Version Data H63b1u
Wireless Transmitter Controller Version Data H63b1v
Wireless Transmitter Controller Version Data H63b1w
Wireless Transmitter Controller Version Data H63b1x

Fig. 1526

OS Updating Software Storage Area
H63c

Battery Controller Updating Software H63c1a
CCD Unit Controller Updating Software H63c1b
Flash Light Unit Controller Updating Software H63c1c
Indicator Controller Updating Software H63c1d
Input Device Controller Updating Software H63c1e
LCD Controller Updating Software H63c1f
LED Controller Updating Software H63c1g
Memory Card Interface Controller Updating Software H63c1h
Microphone Controller Updating Software H63c1i
Photometer Controller Updating Software H63c1j
RAM Controller Updating Software H63c1k
ROM Controller Updating Software H63c1l

Fig. 1527

OS Updating Software Storage Area H63c (cont.)

Signal Processor Controller Updating Software H63c1m
Signal Processor Controller Updating Software H63c1n
Solar Panel Controller Updating Software H63c1o
Speaker Controller Updating Software H63c1p
Vibrator Controller Updating Software H63c1q
Video Processor Controller Updating Software H63c1r
Wireless Receiver Controller Updating Software H63c1s
Wireless Receiver Controller Updating Software H63c1t
Wireless Receiver Controller Updating Software H63c1u
Wireless Transmitter Controller Updating Software H63c1v
Wireless Transmitter Controller Updating Software H63c1w
Wireless Transmitter Controller Updating Software H63c1x Fig. 1528
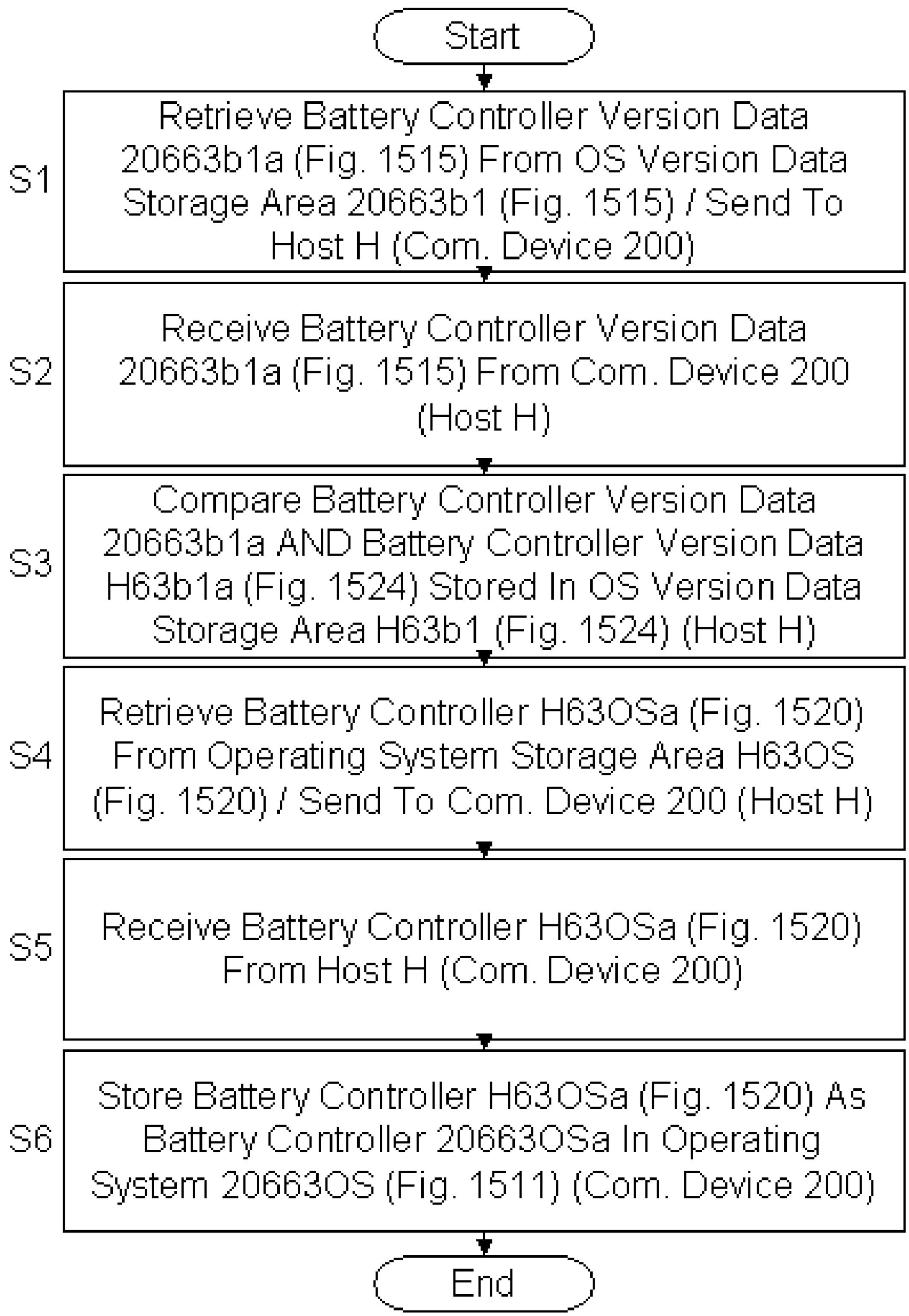

Fig. 1529
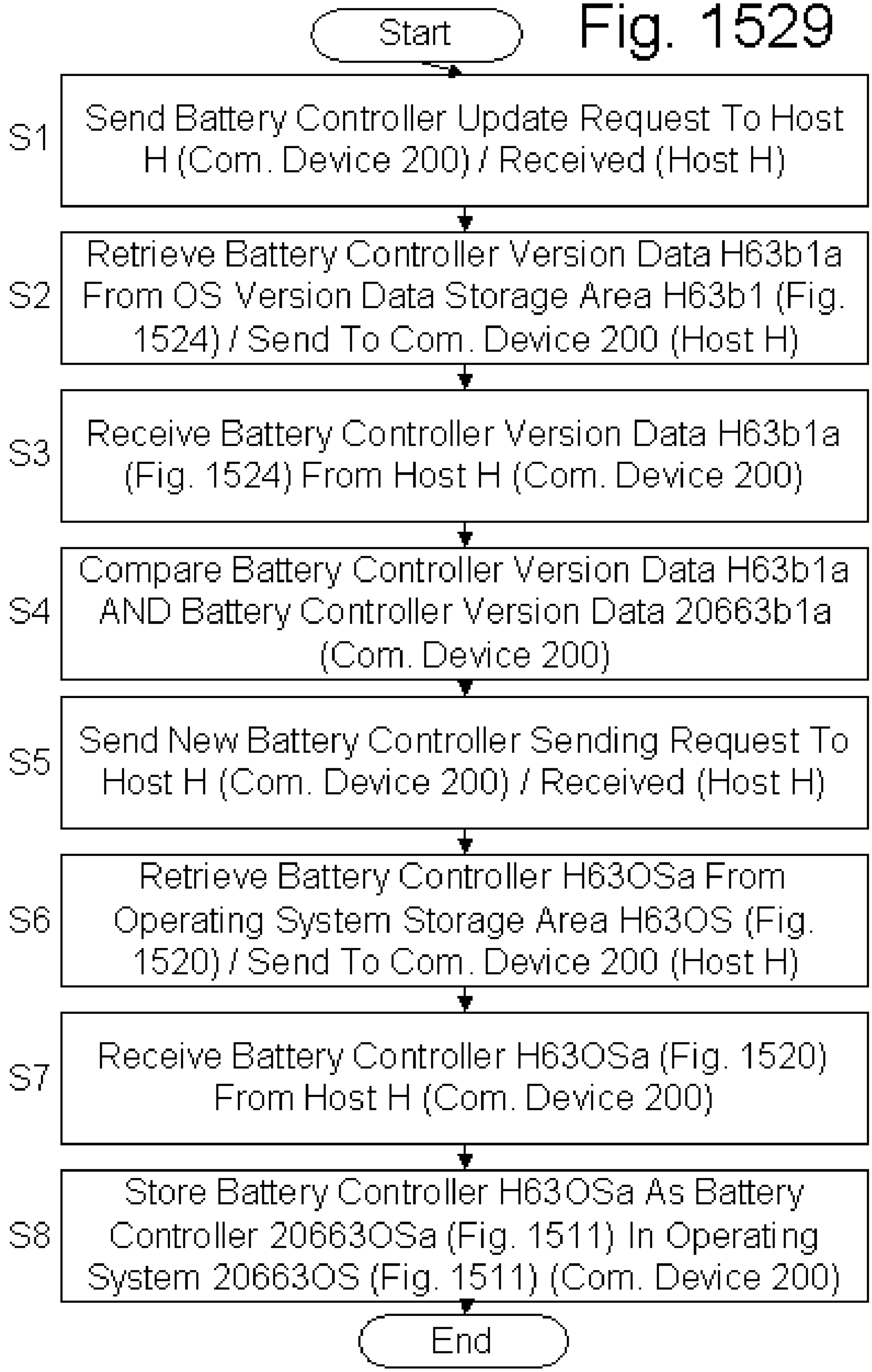

Fig. 1530
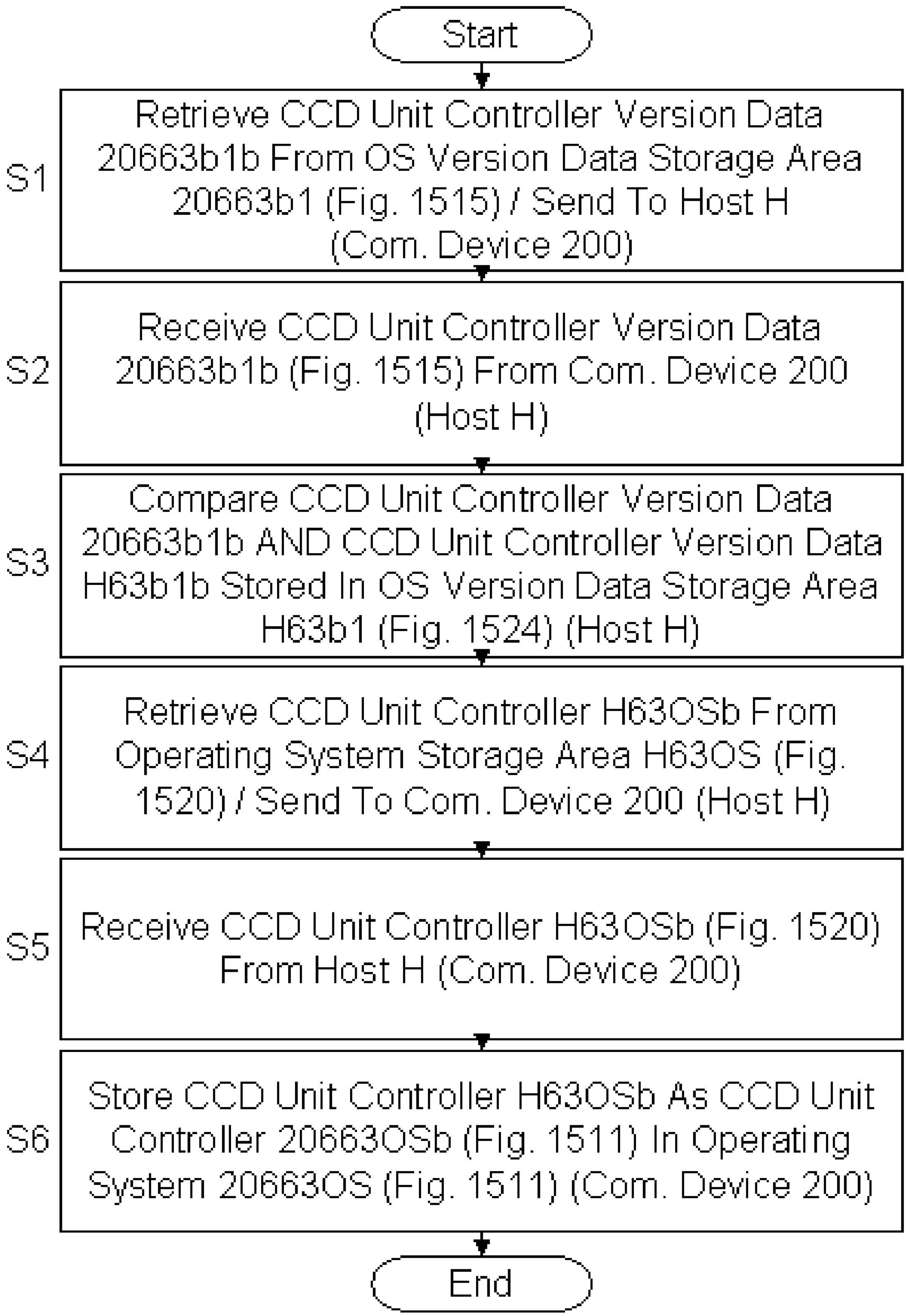

Fig. 1531
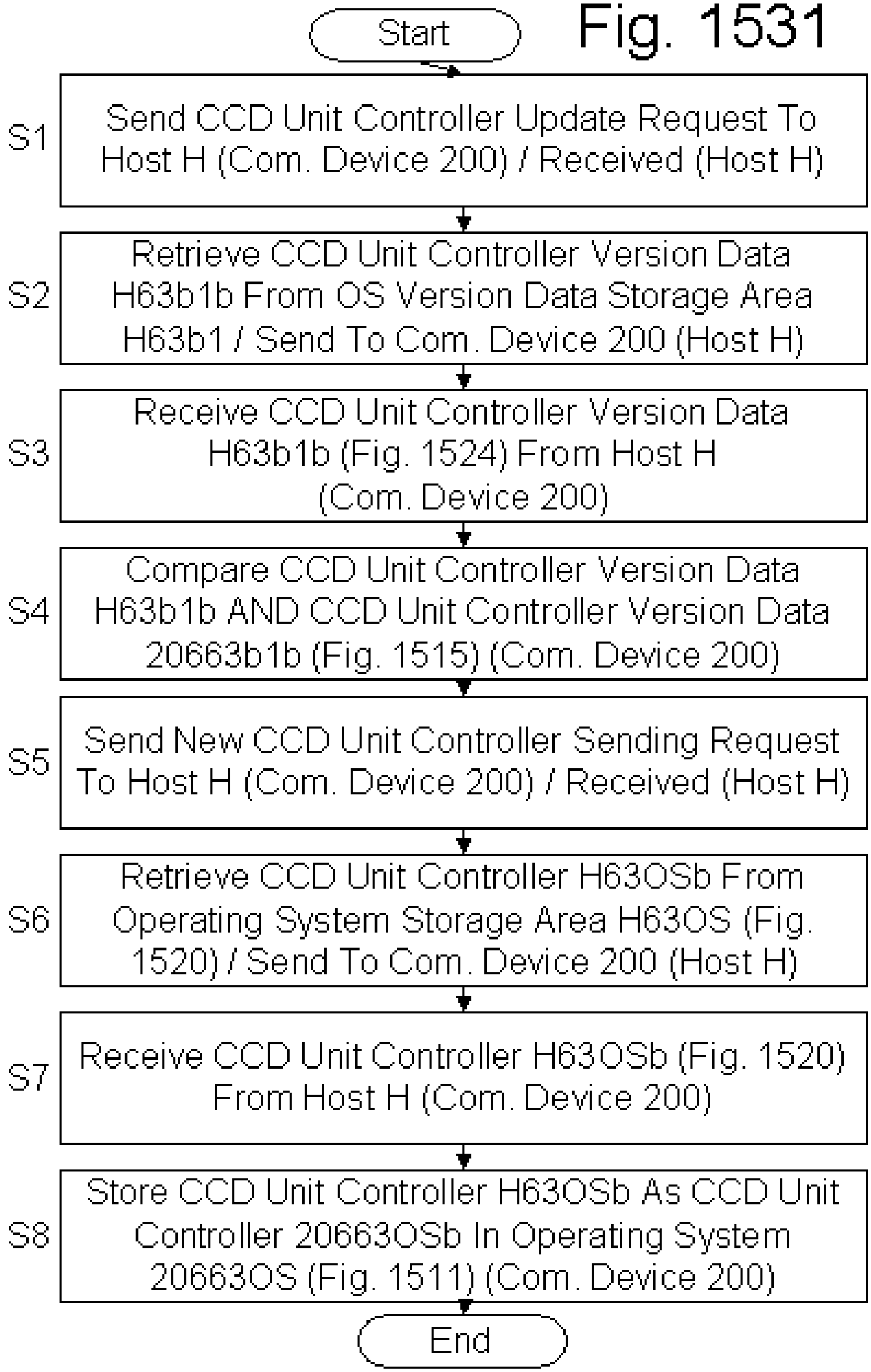

Fig. 1532
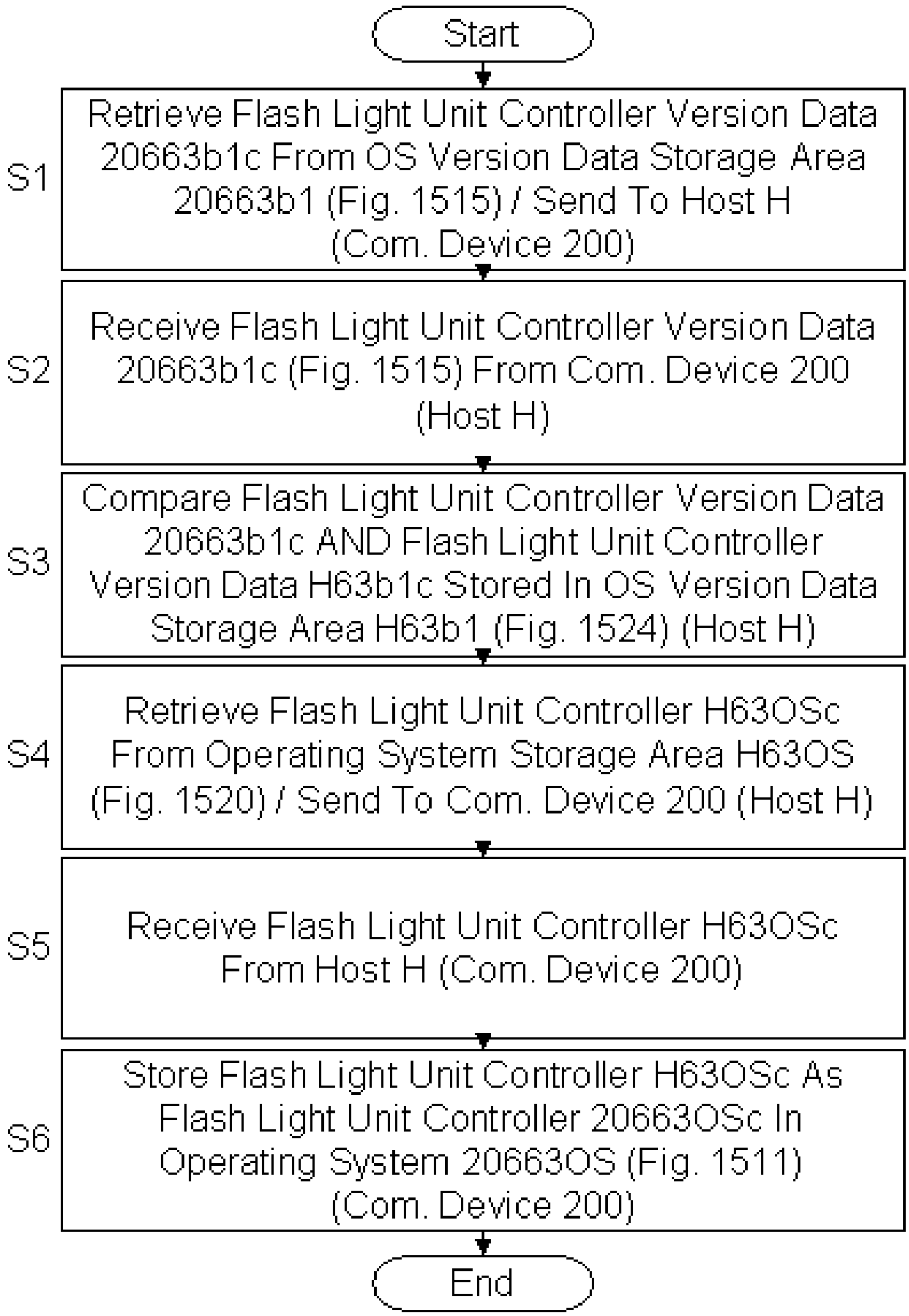

Fig. 1533
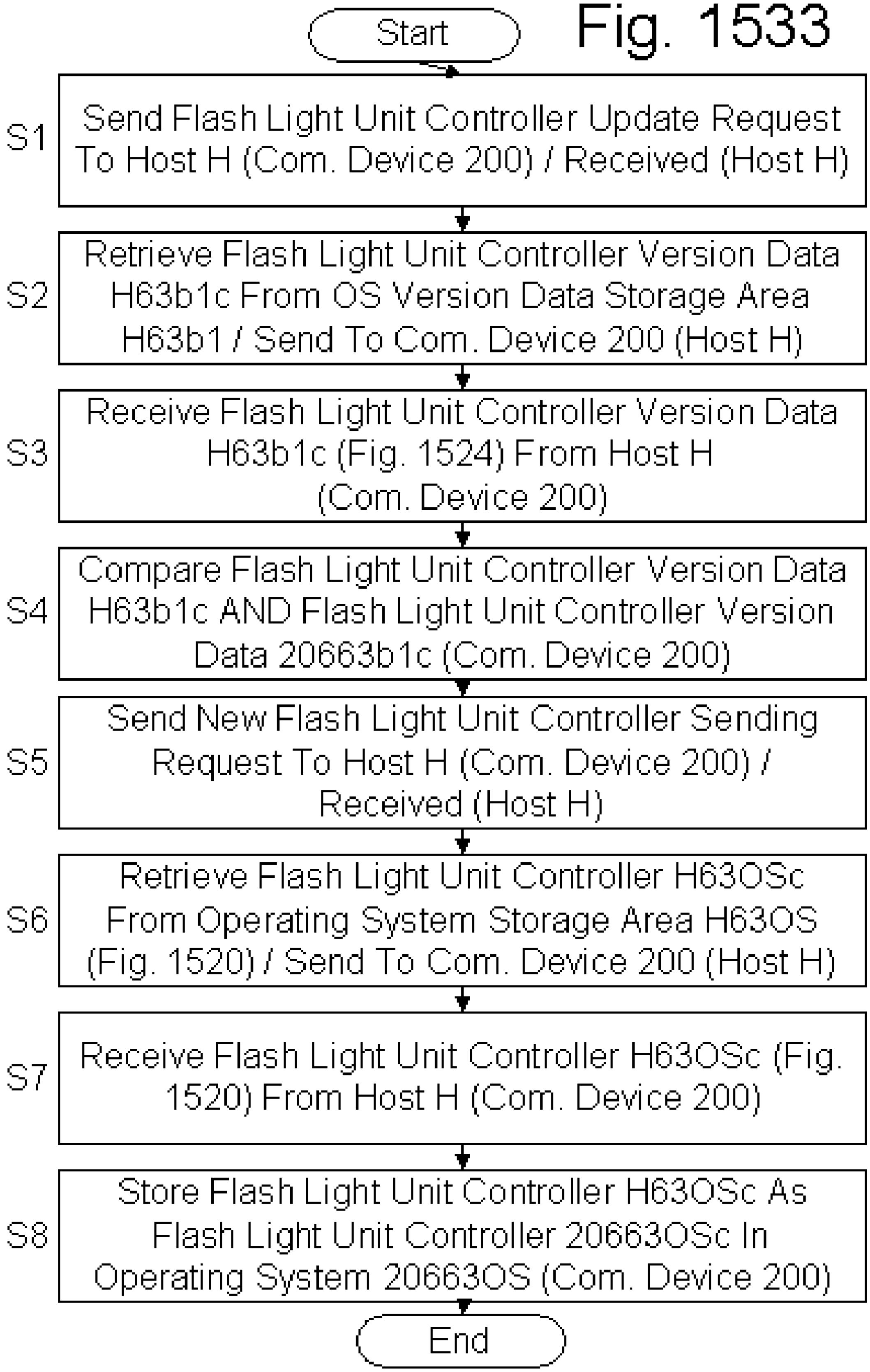

Fig. 1534
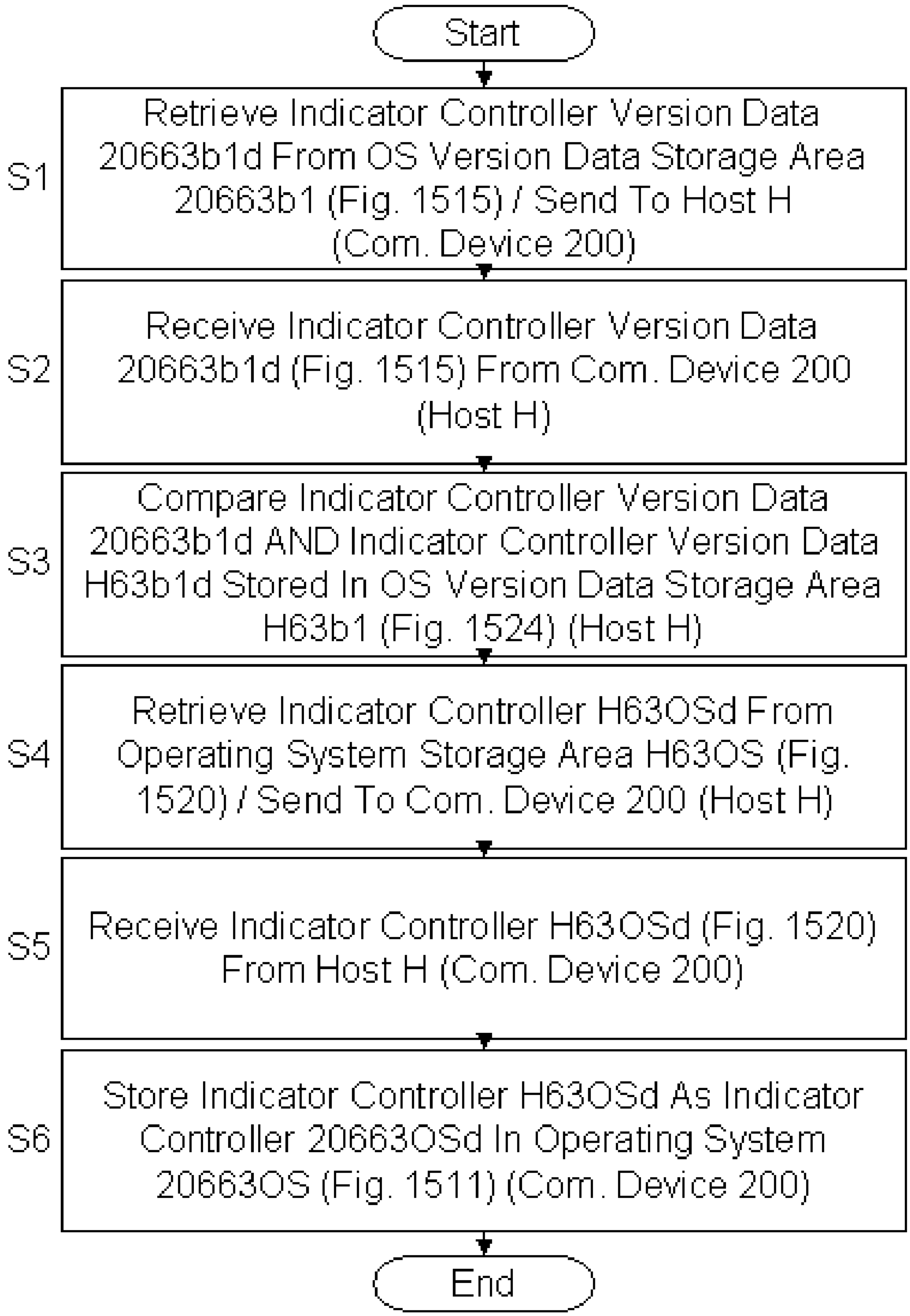

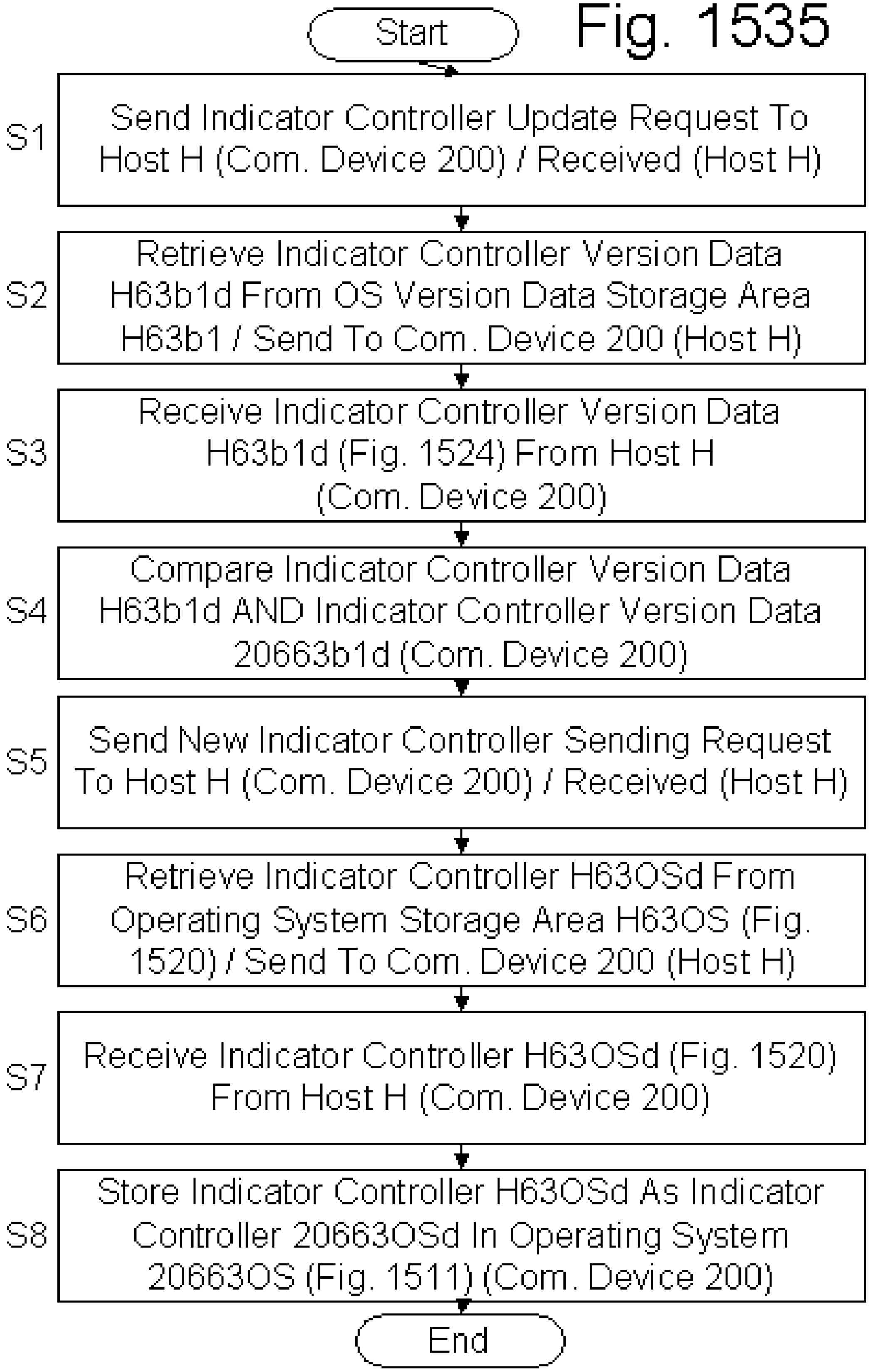
Fig. 1535

Fig. 1536
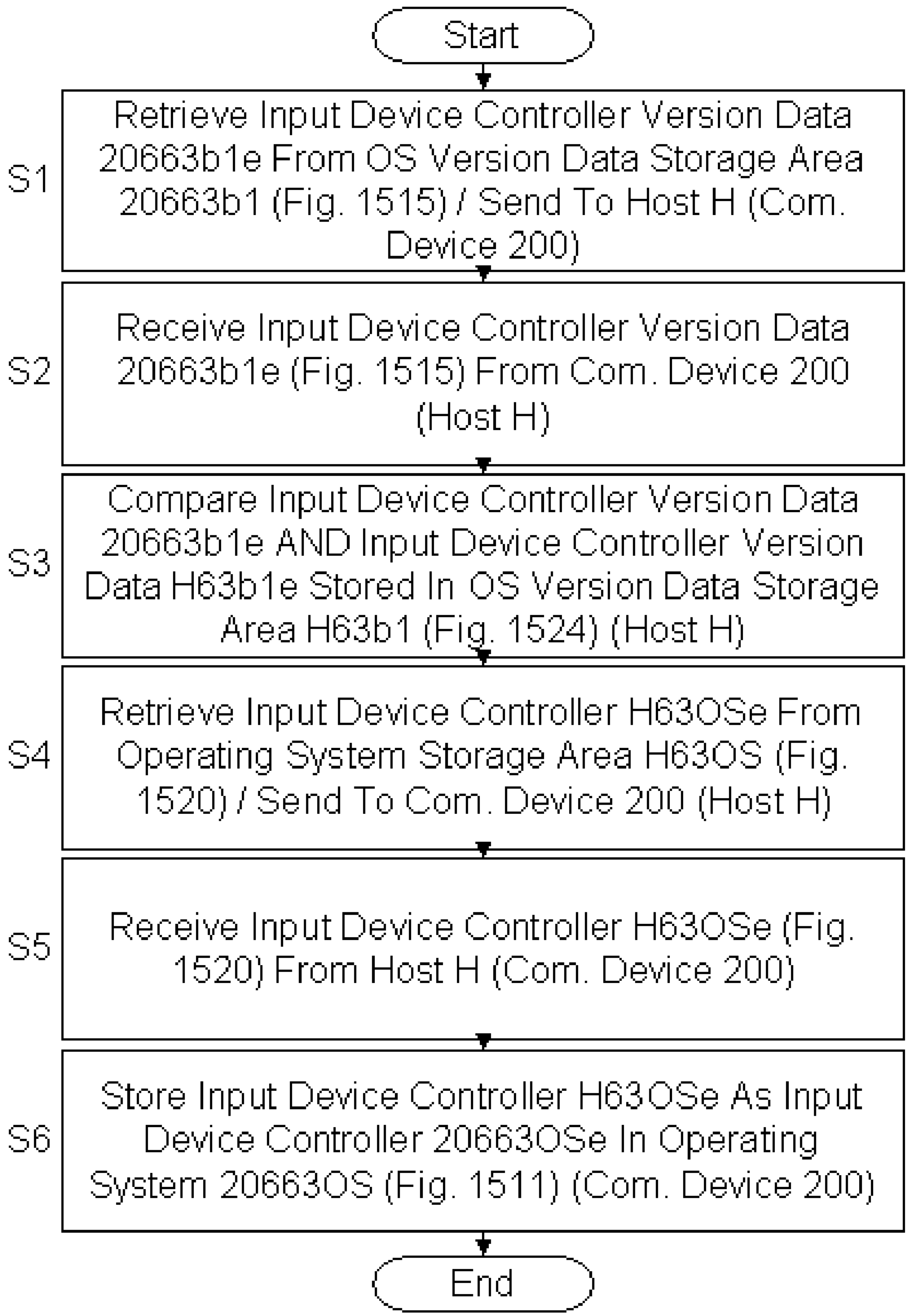

Fig. 1537
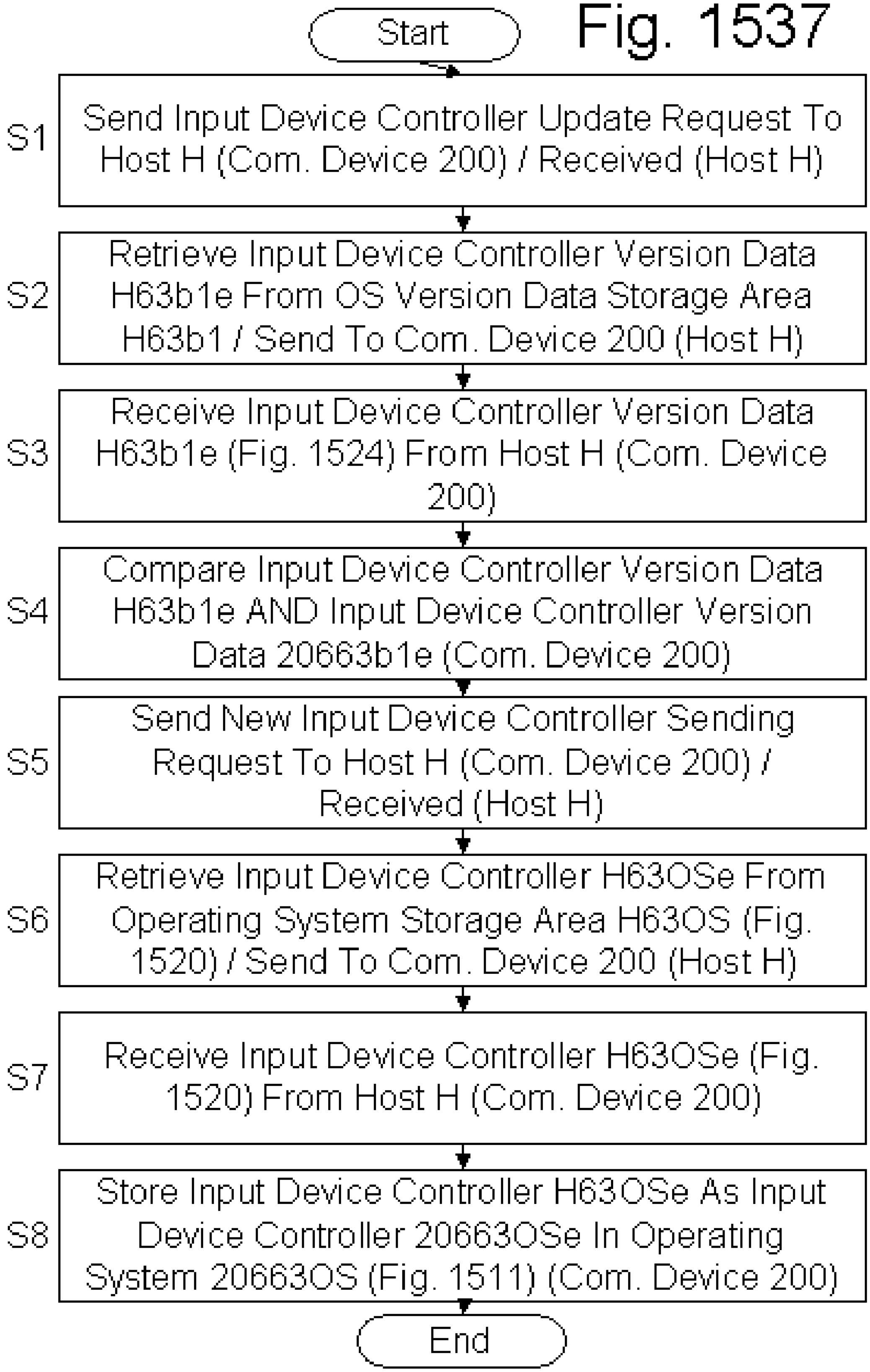

Fig. 1538
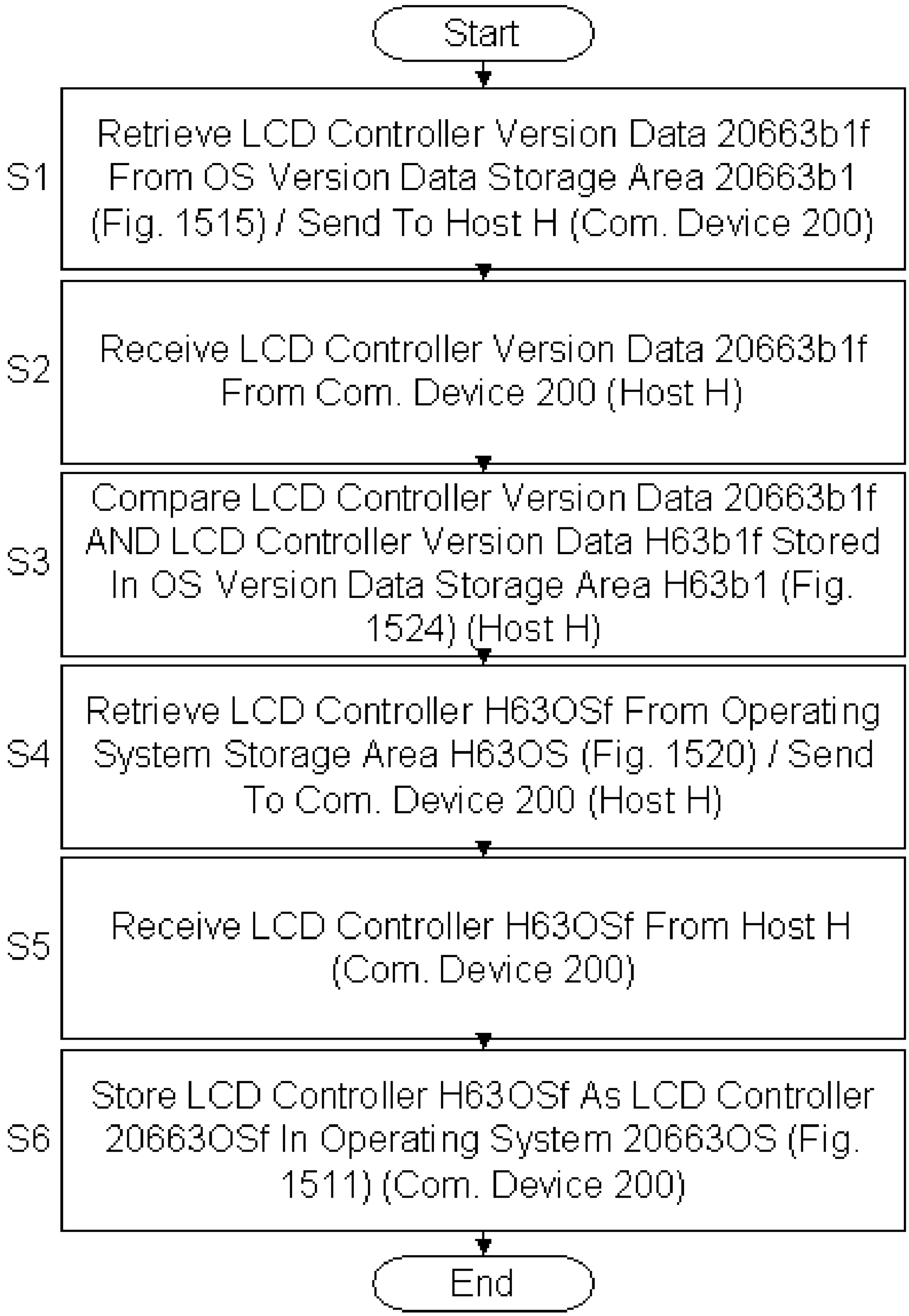

Fig. 1539
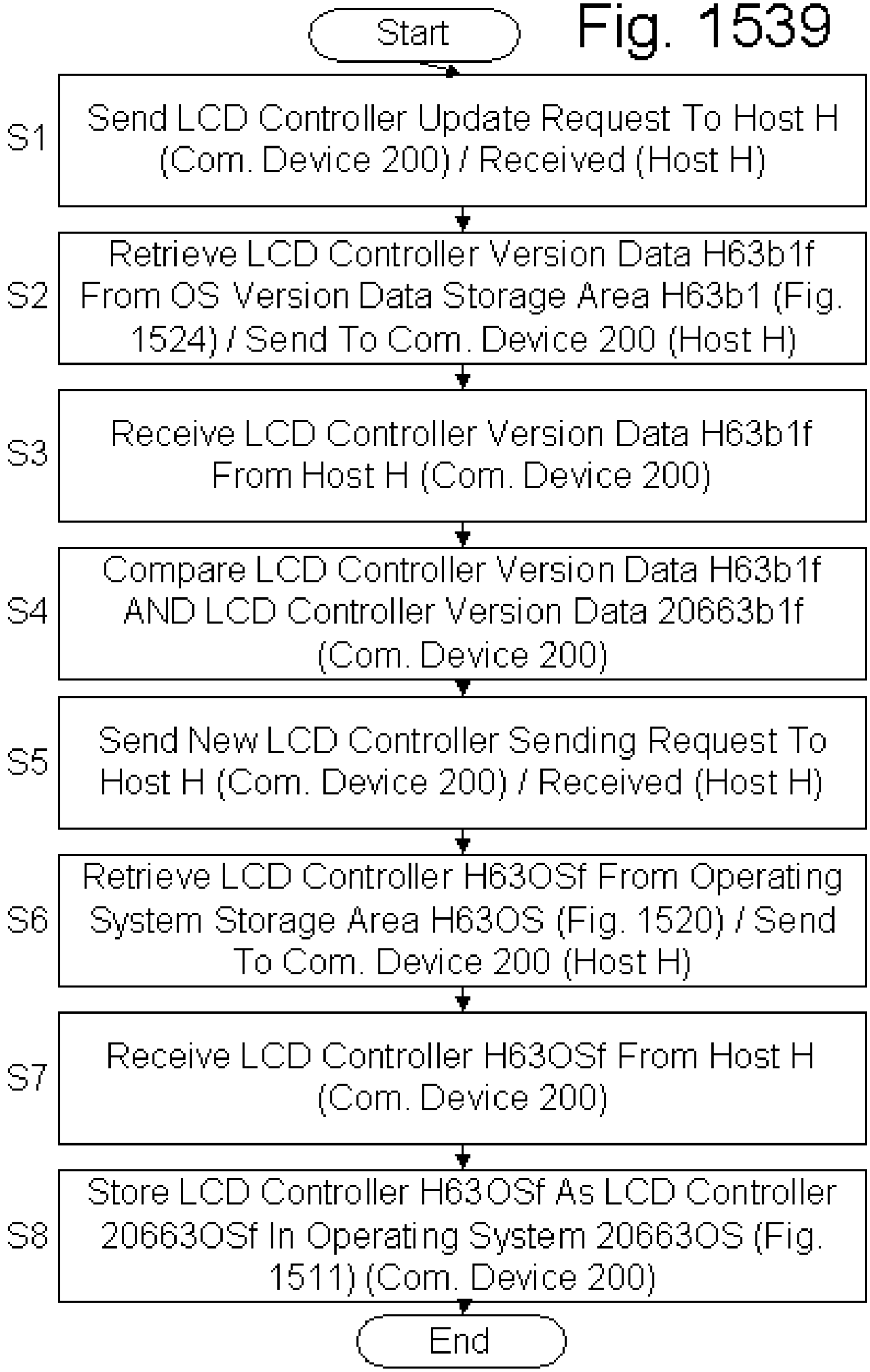

Fig. 1540
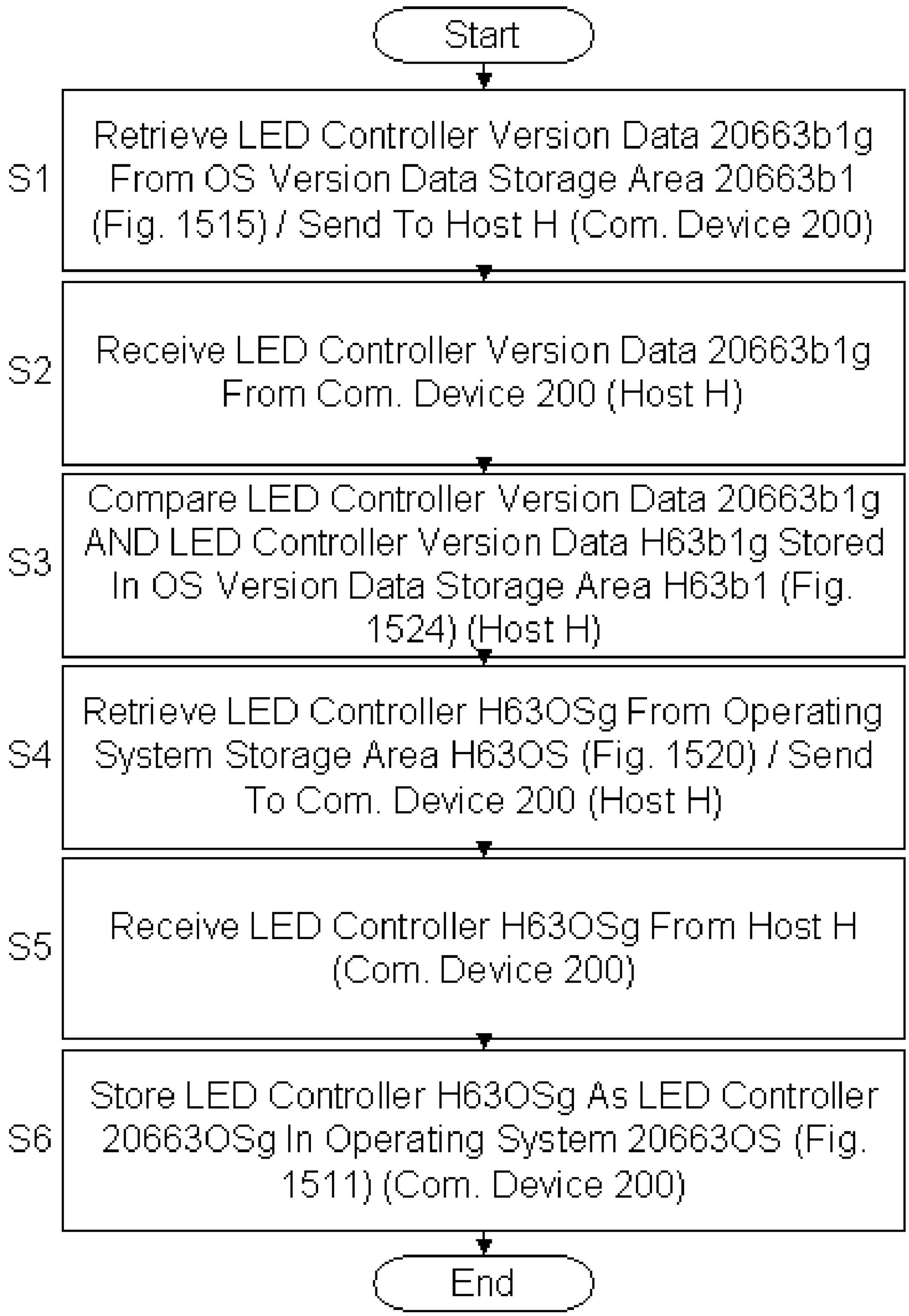

Fig. 1541
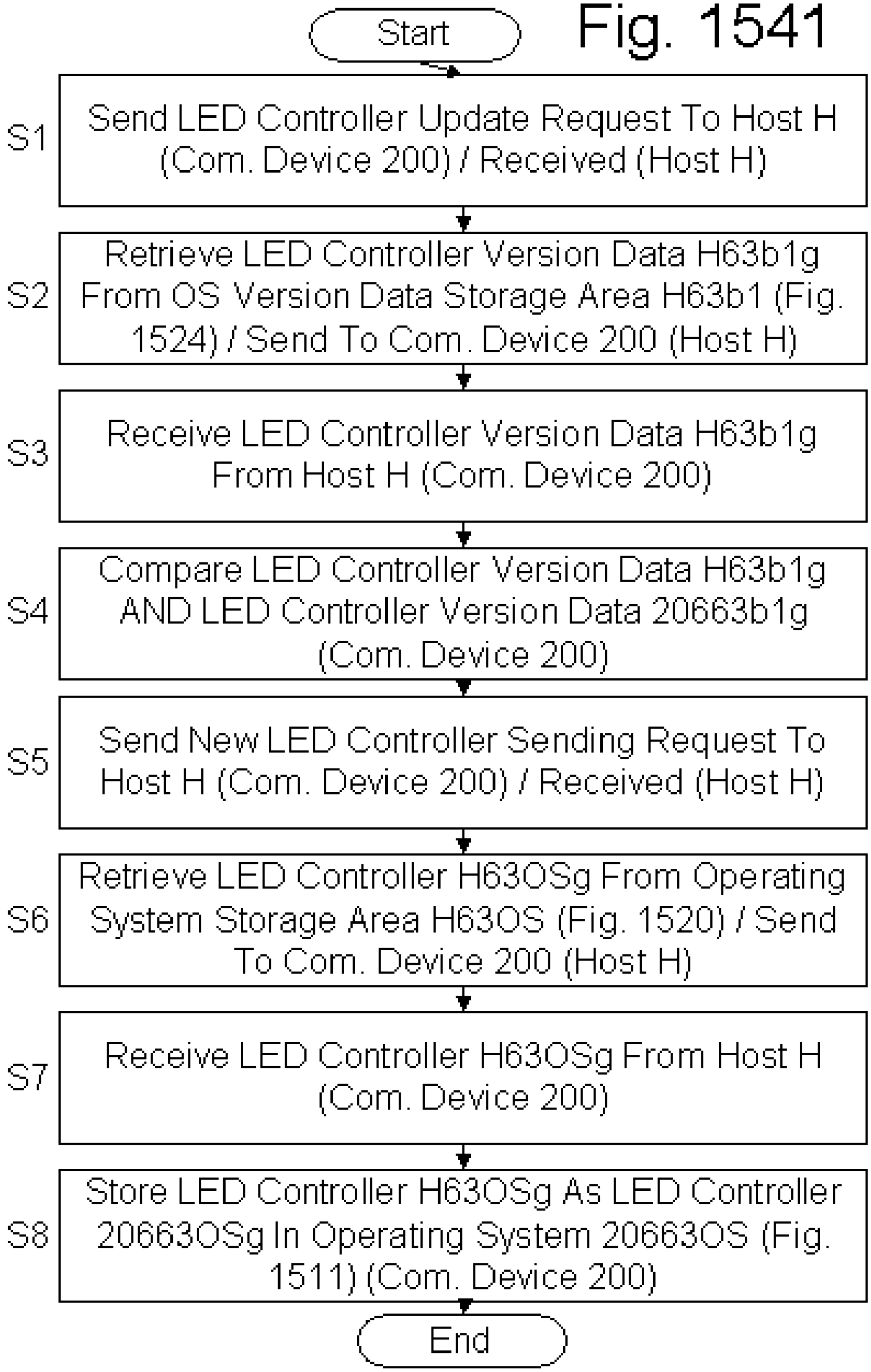

Fig. 1542
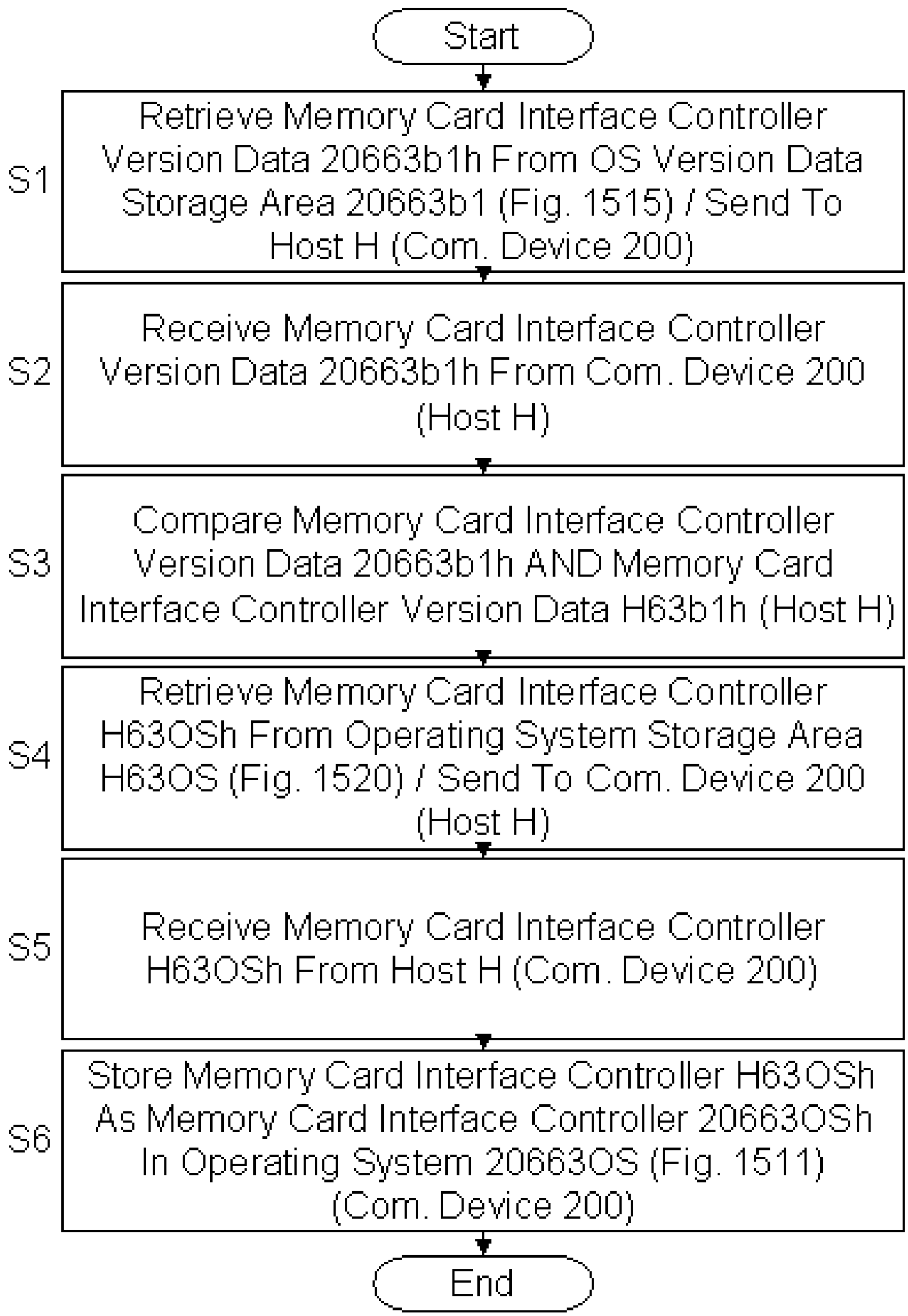

Fig. 1543
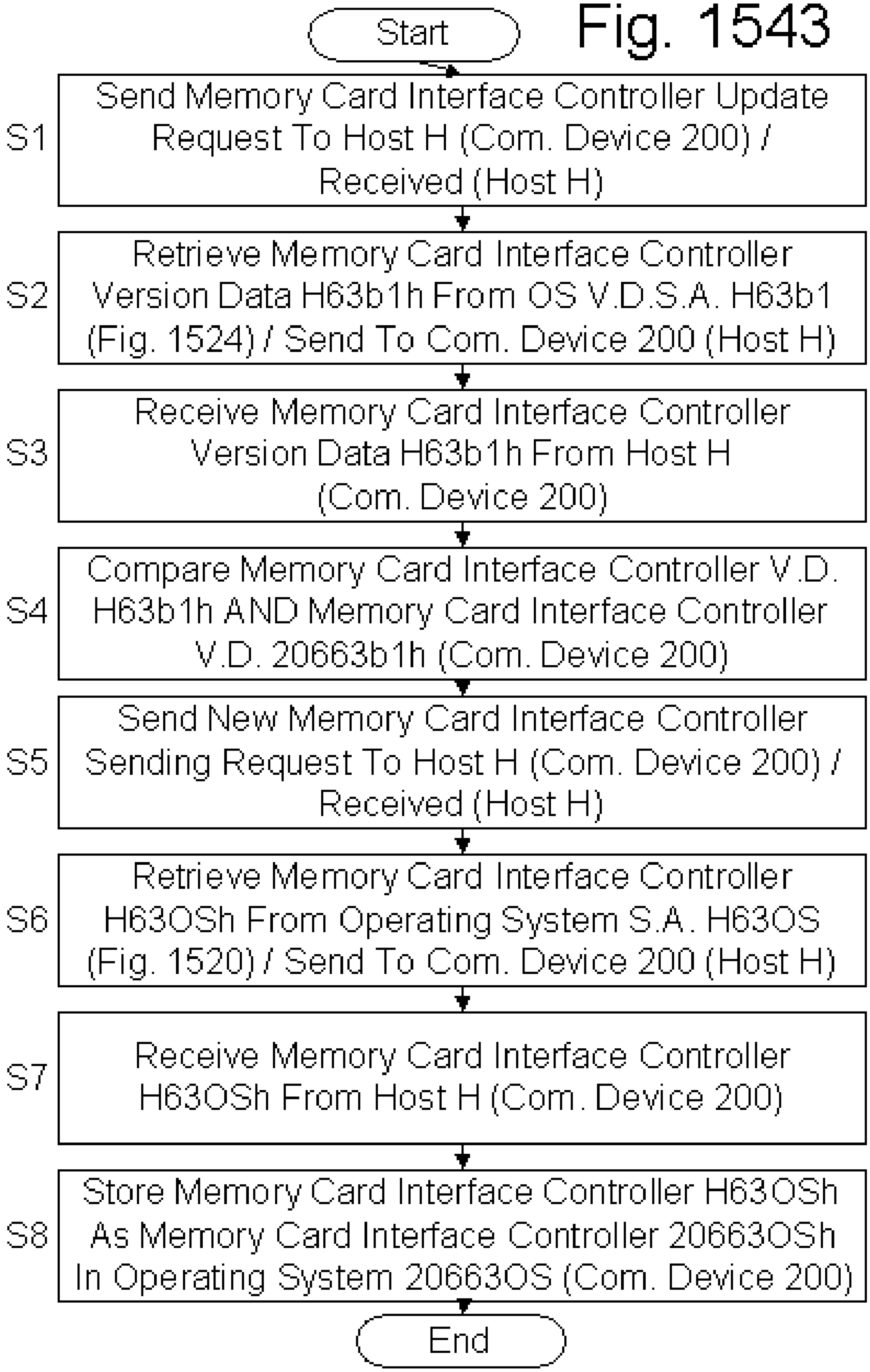

Fig. 1544
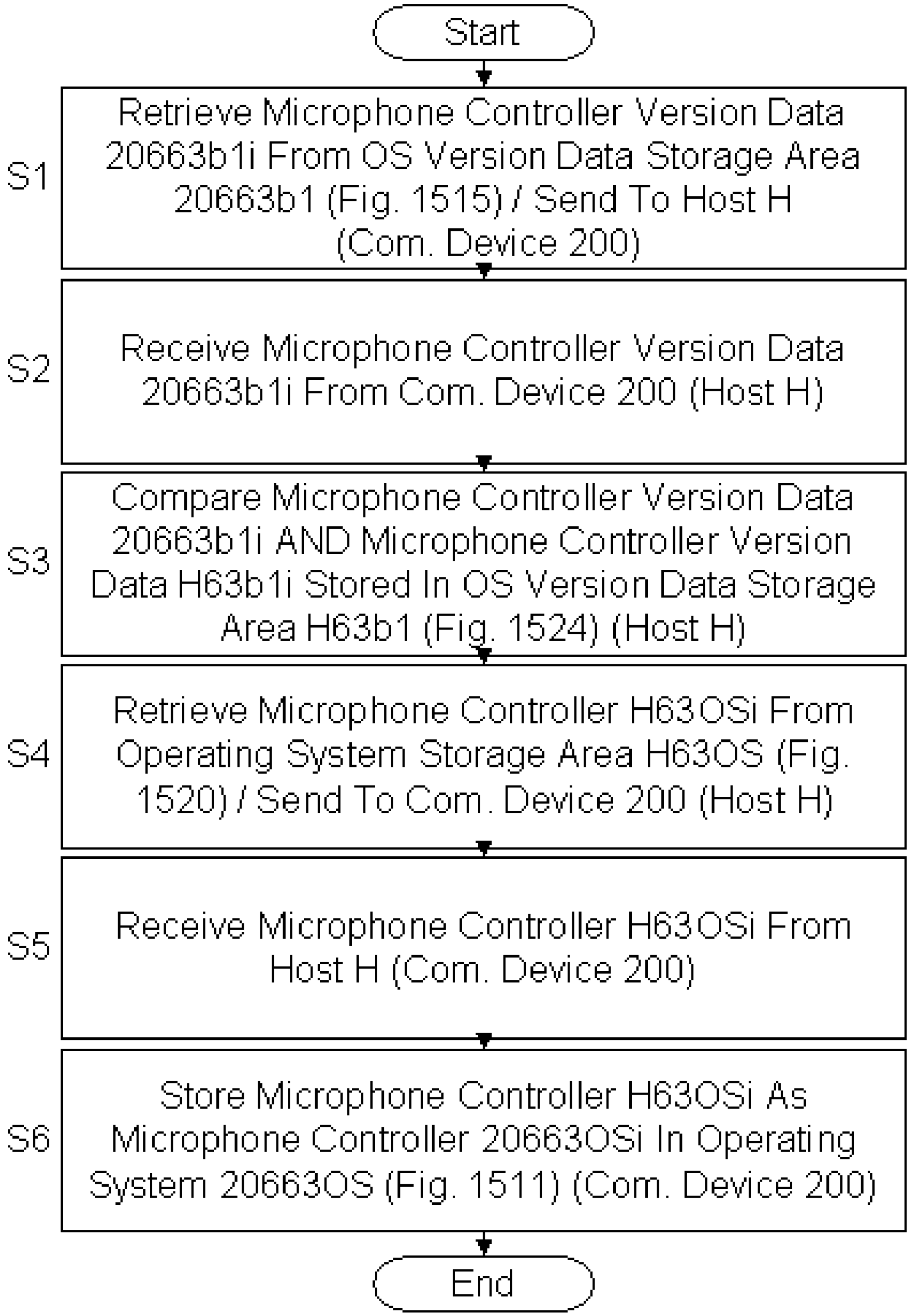

Fig. 1545
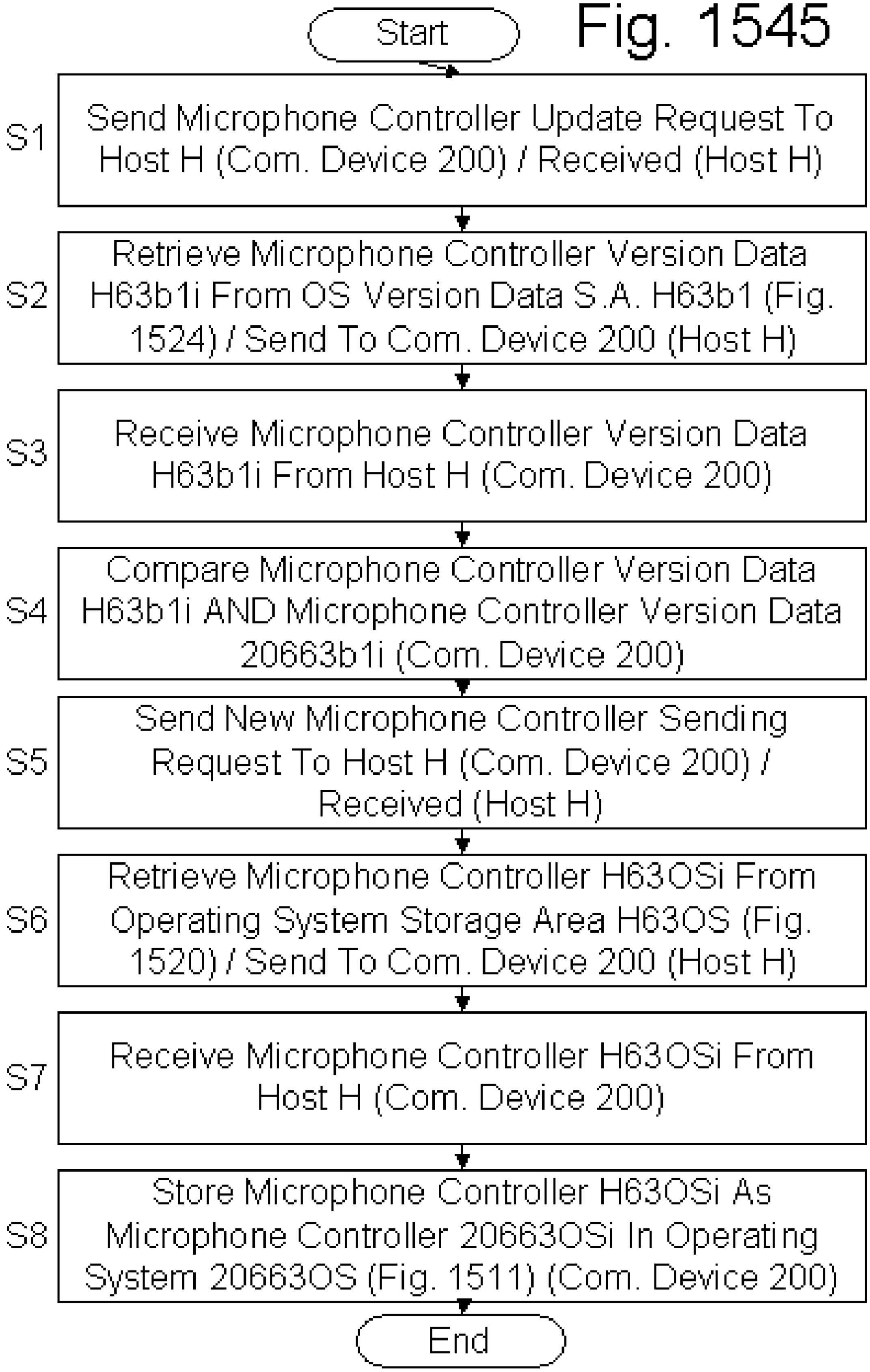

Fig. 1546
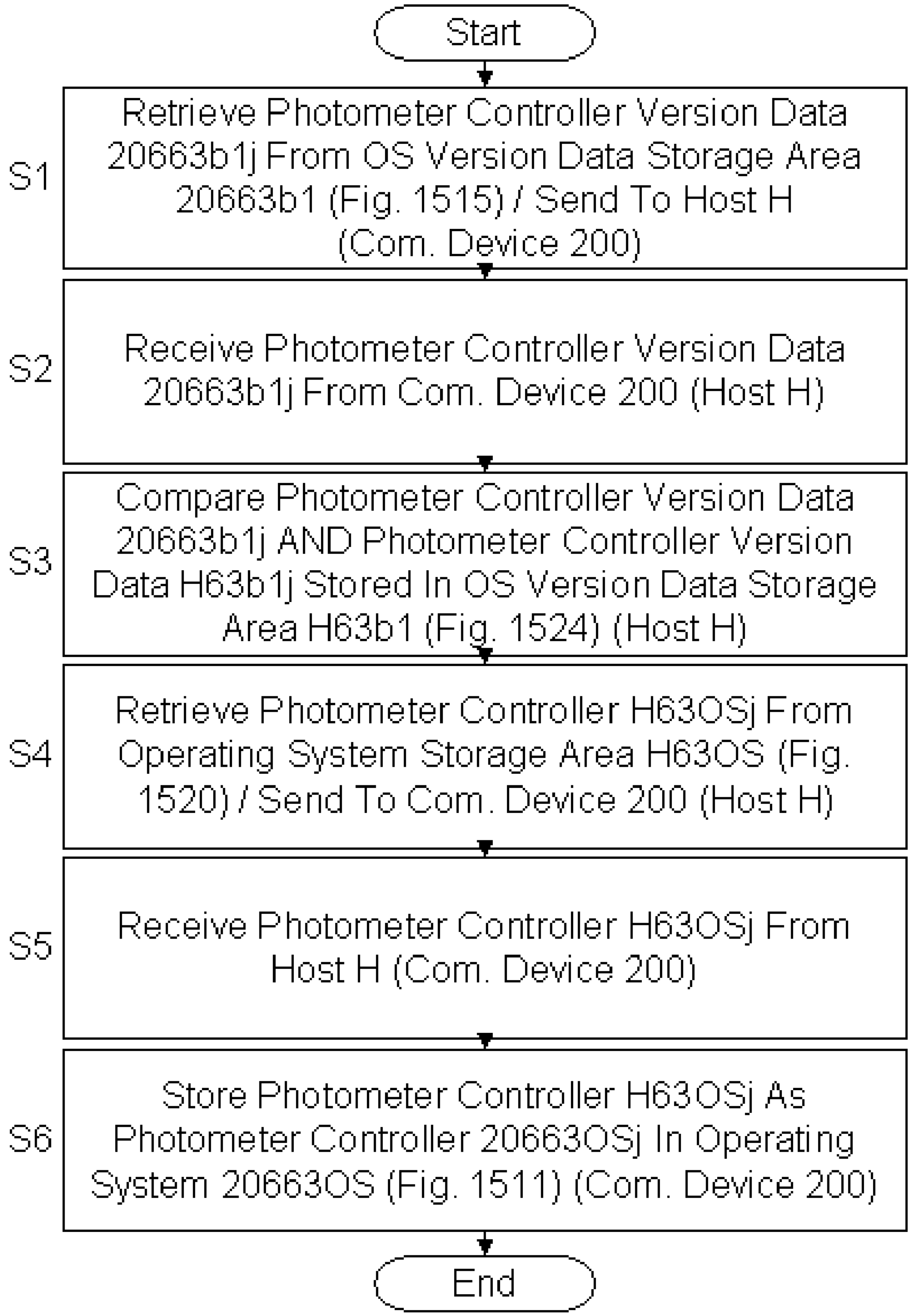

Fig. 1547
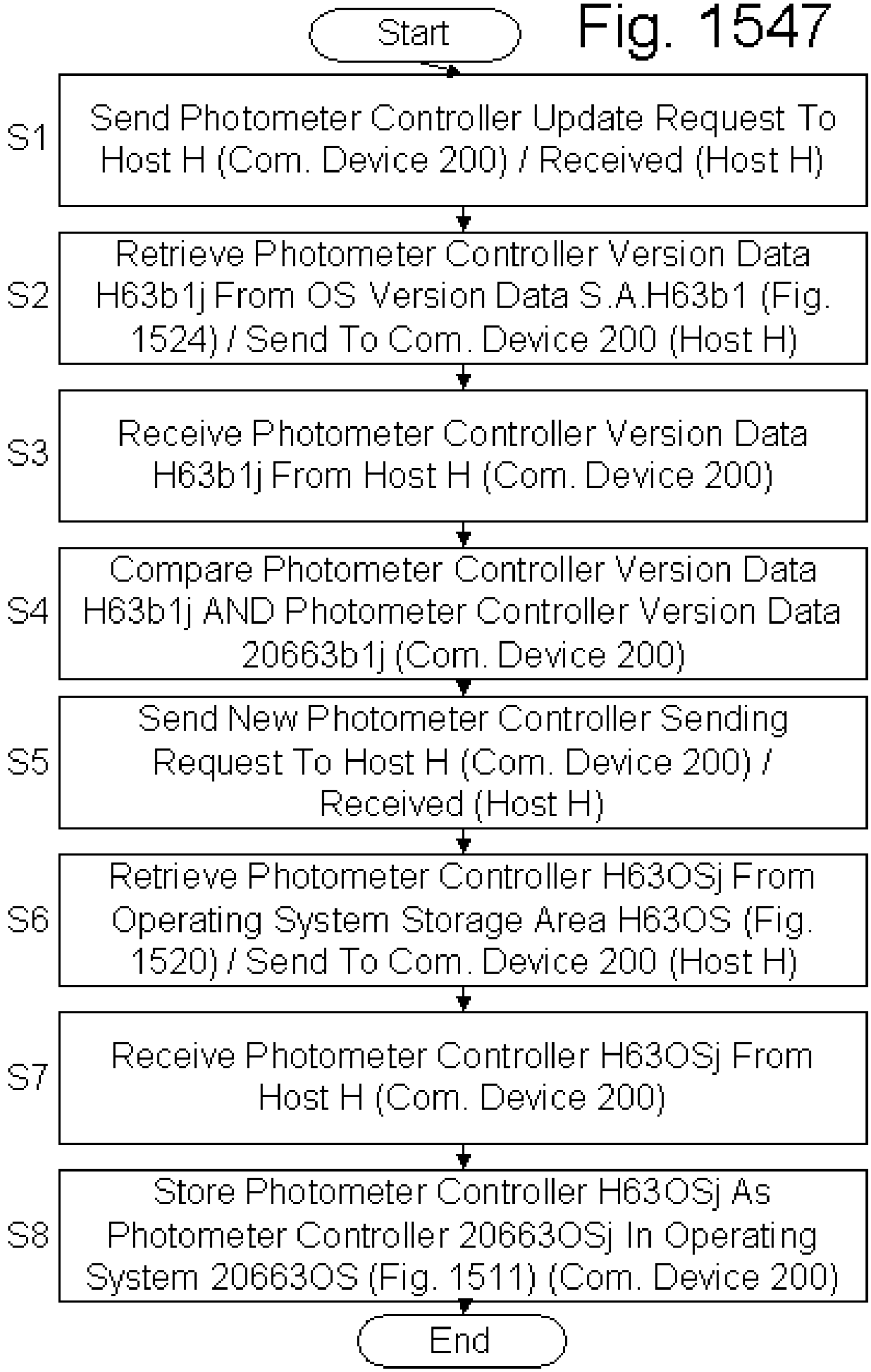

Fig. 1548
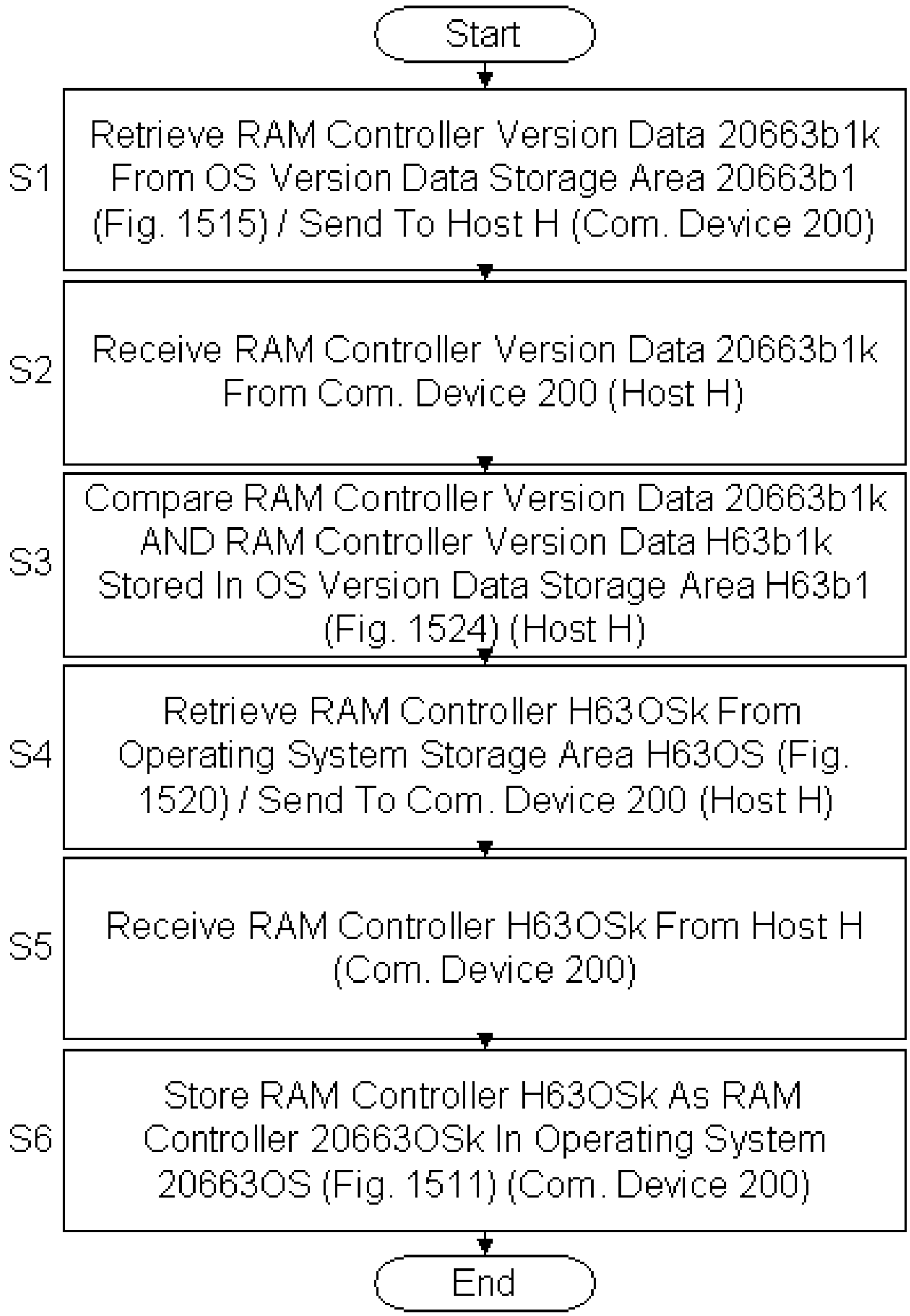

Fig. 1549
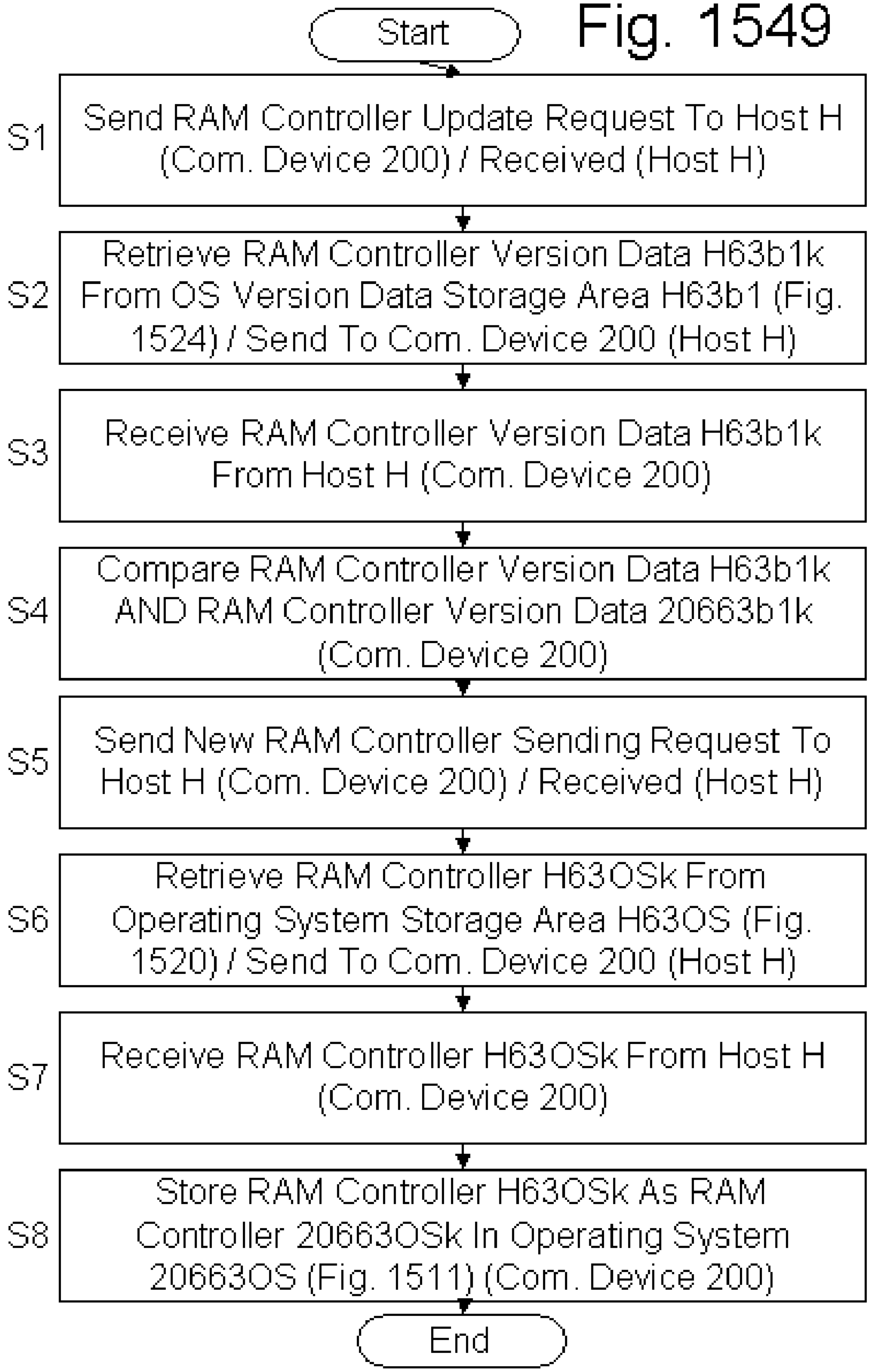

Fig. 1550
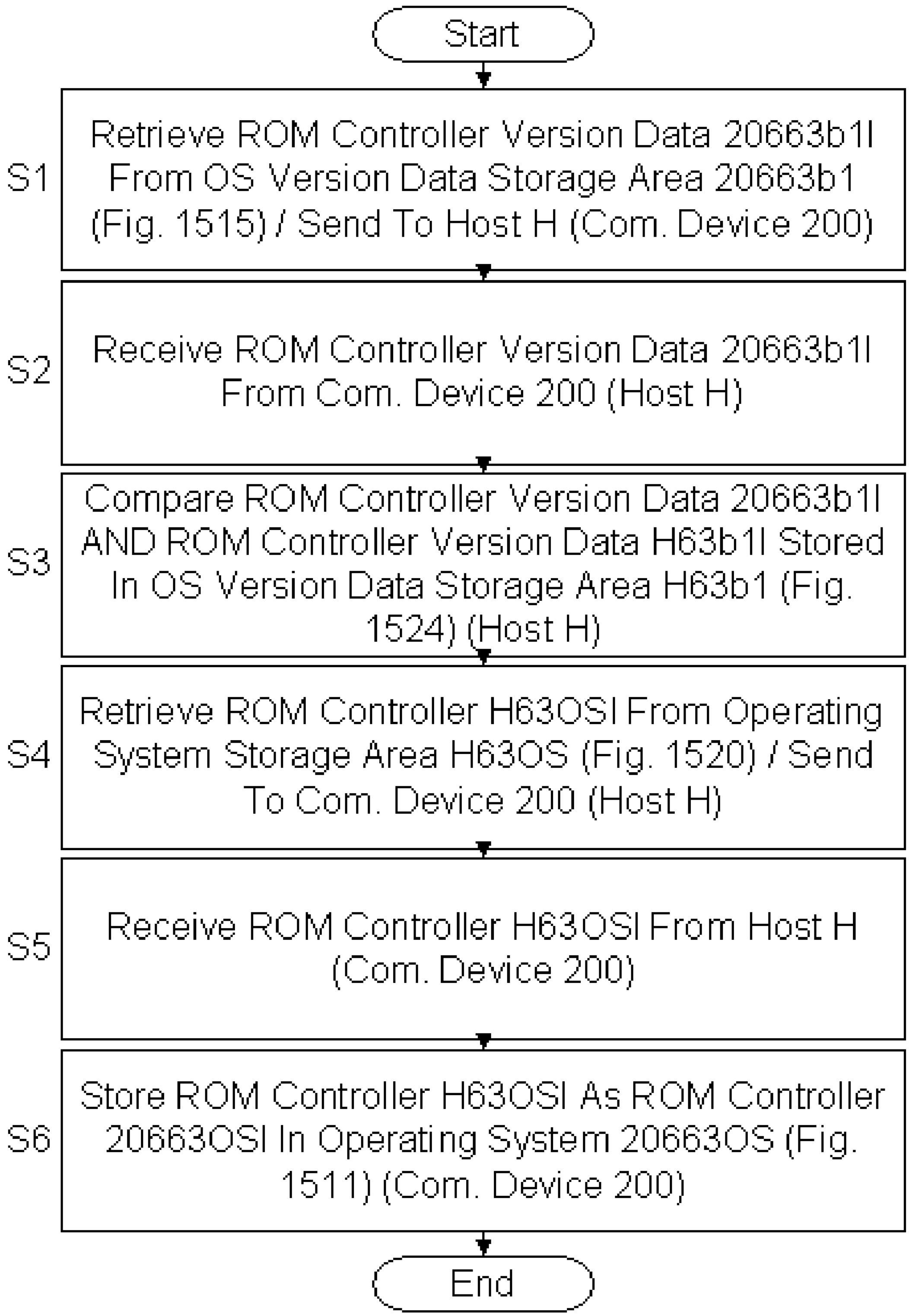

Fig. 1551
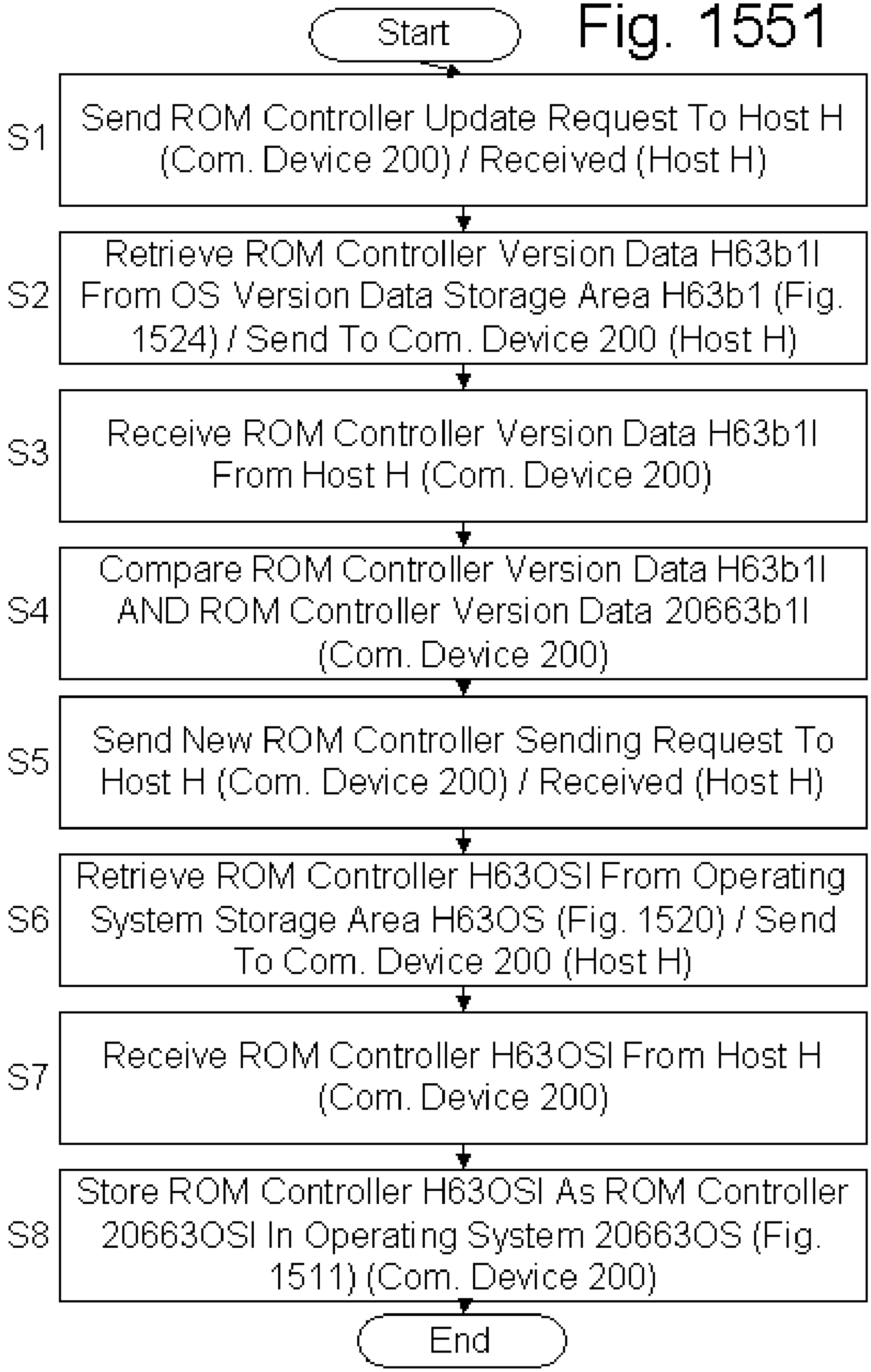

Fig. 1552
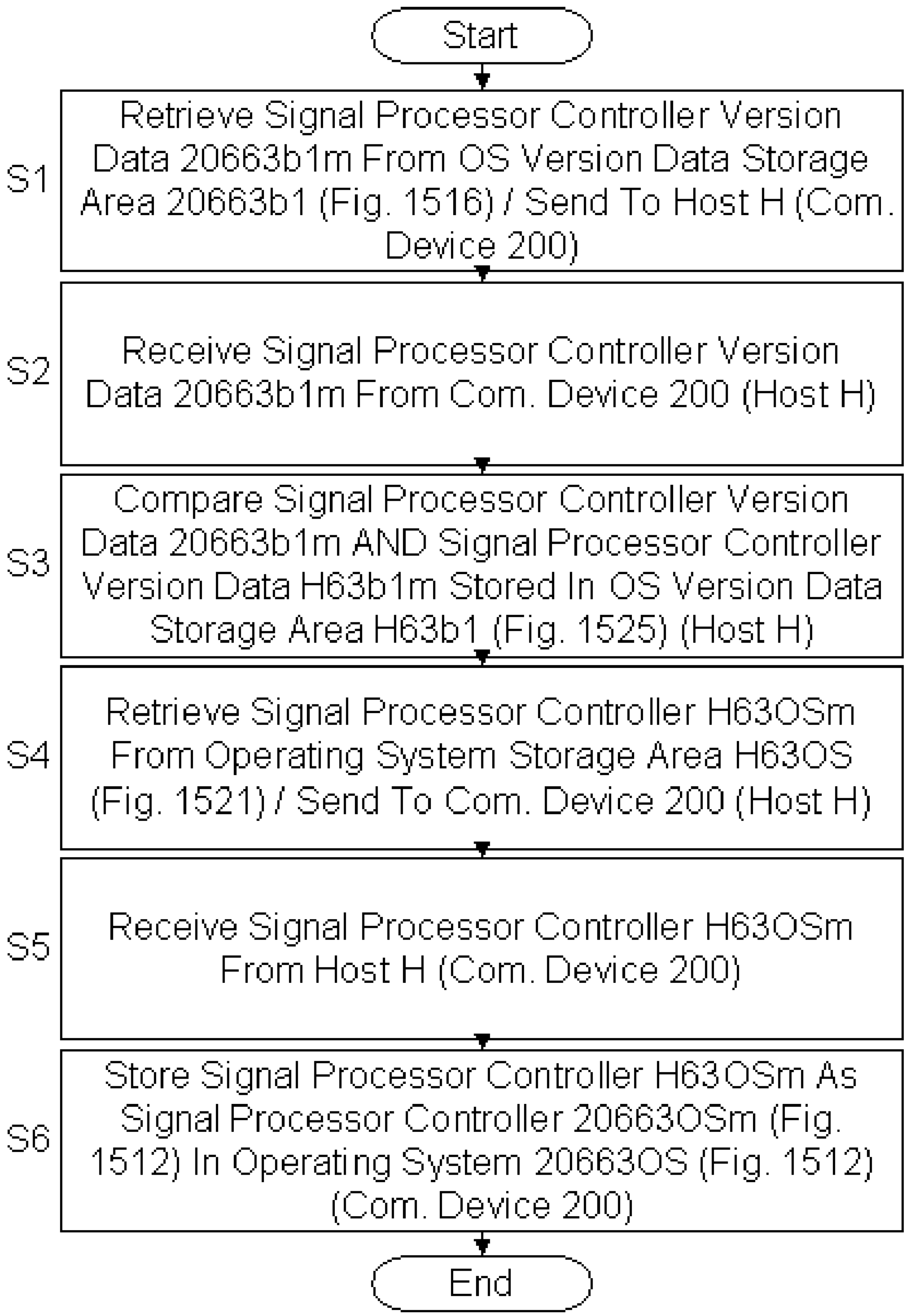

Fig. 1553
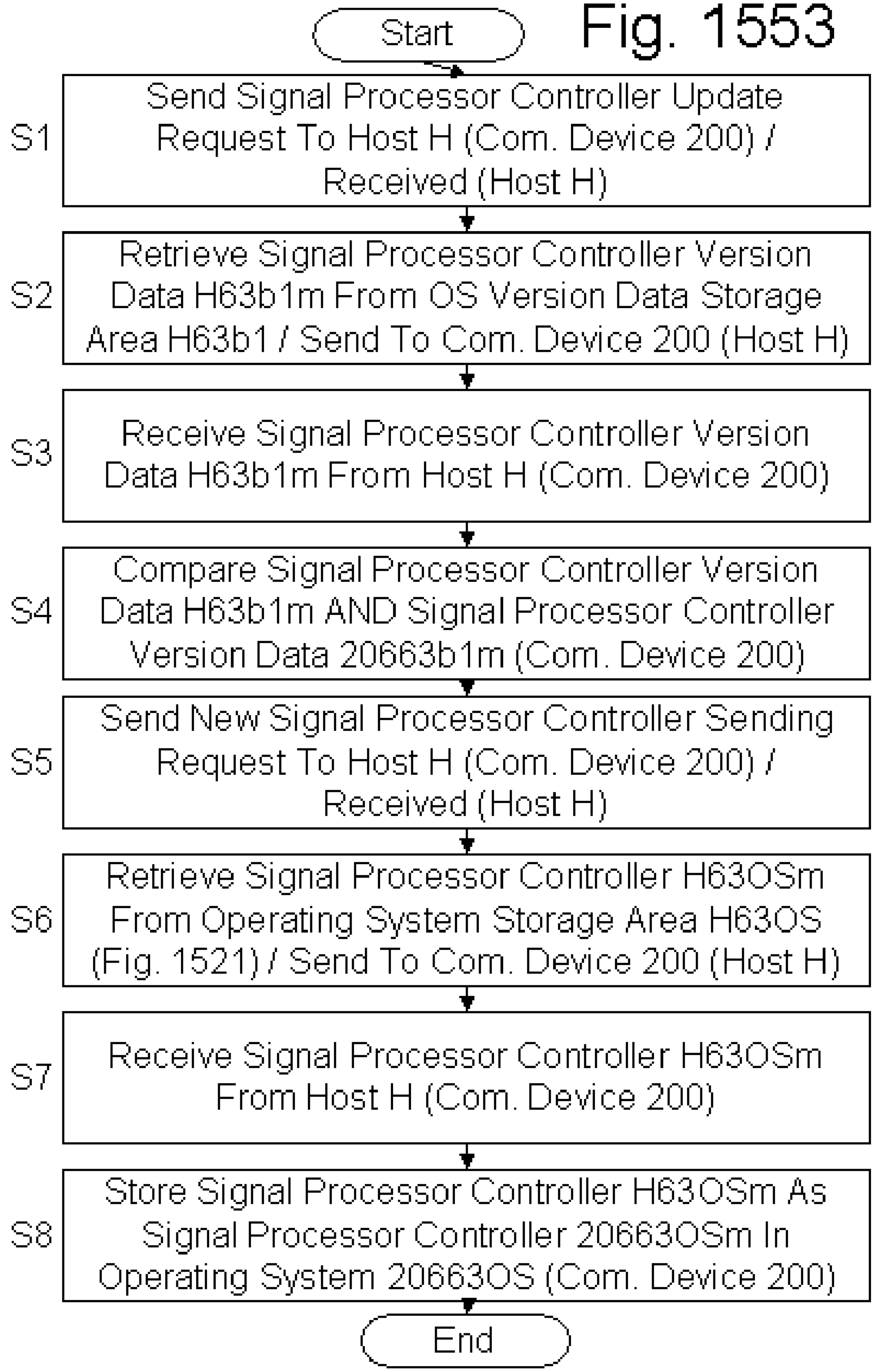

Fig. 1554
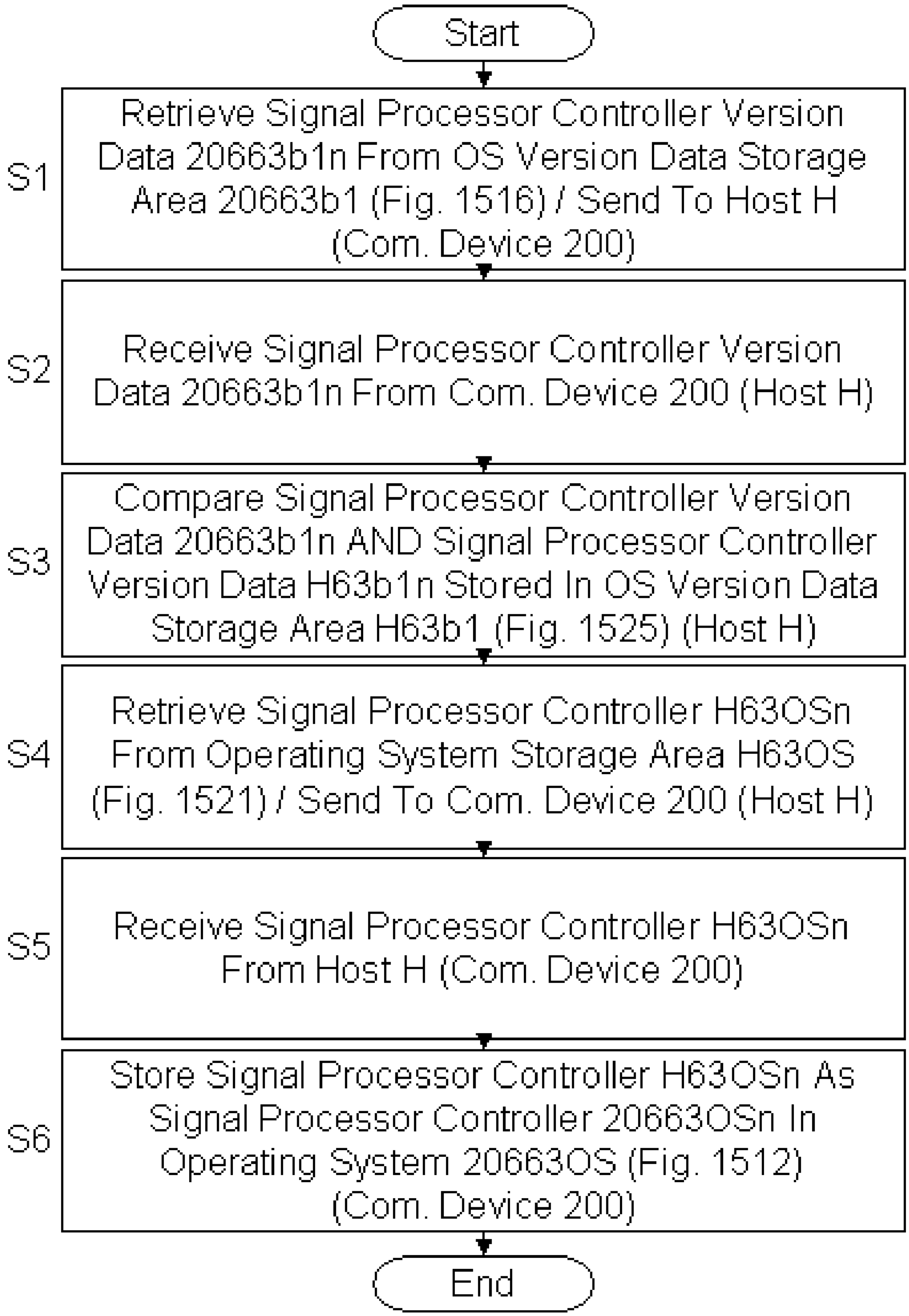

Fig. 1555
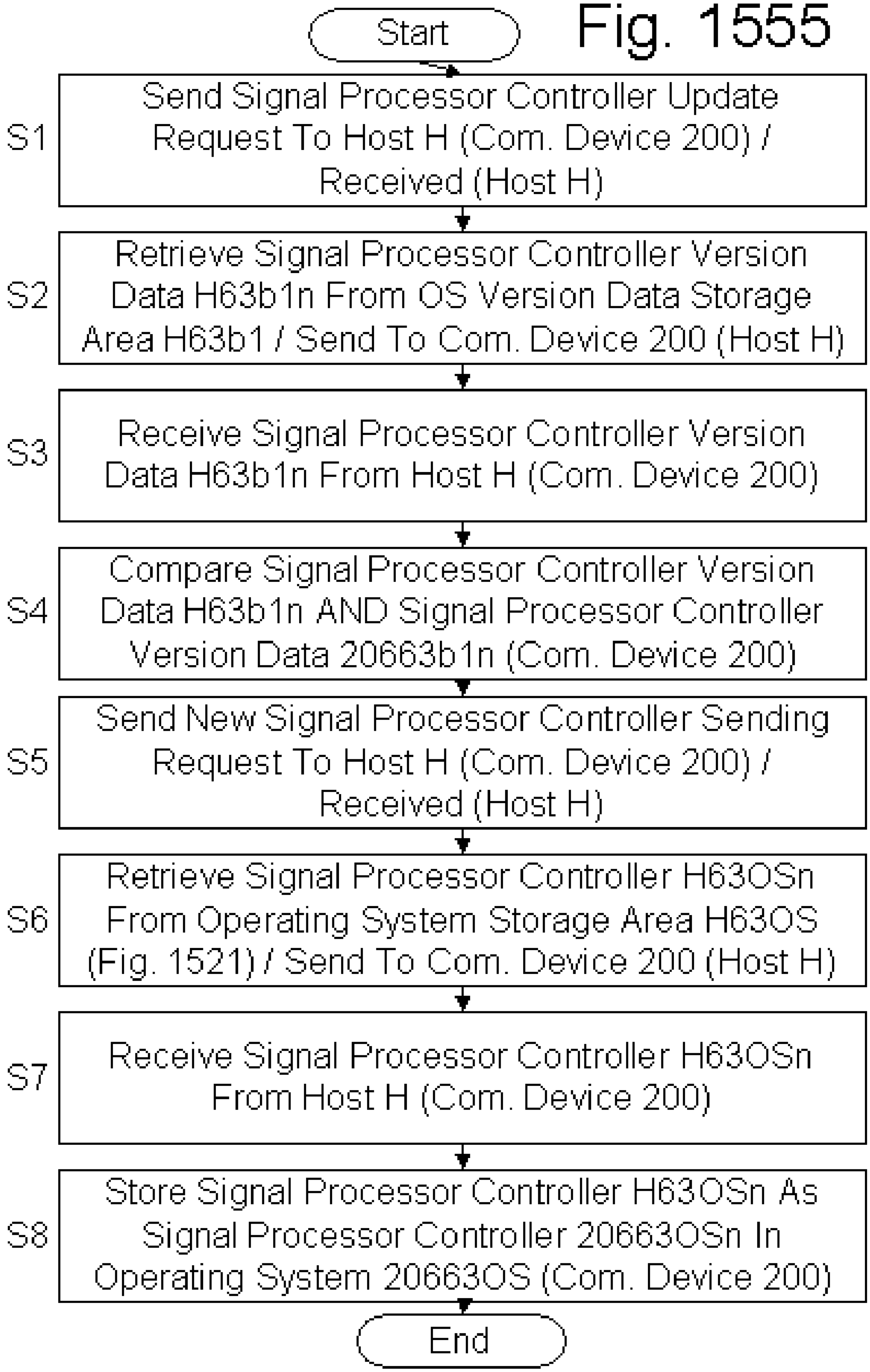

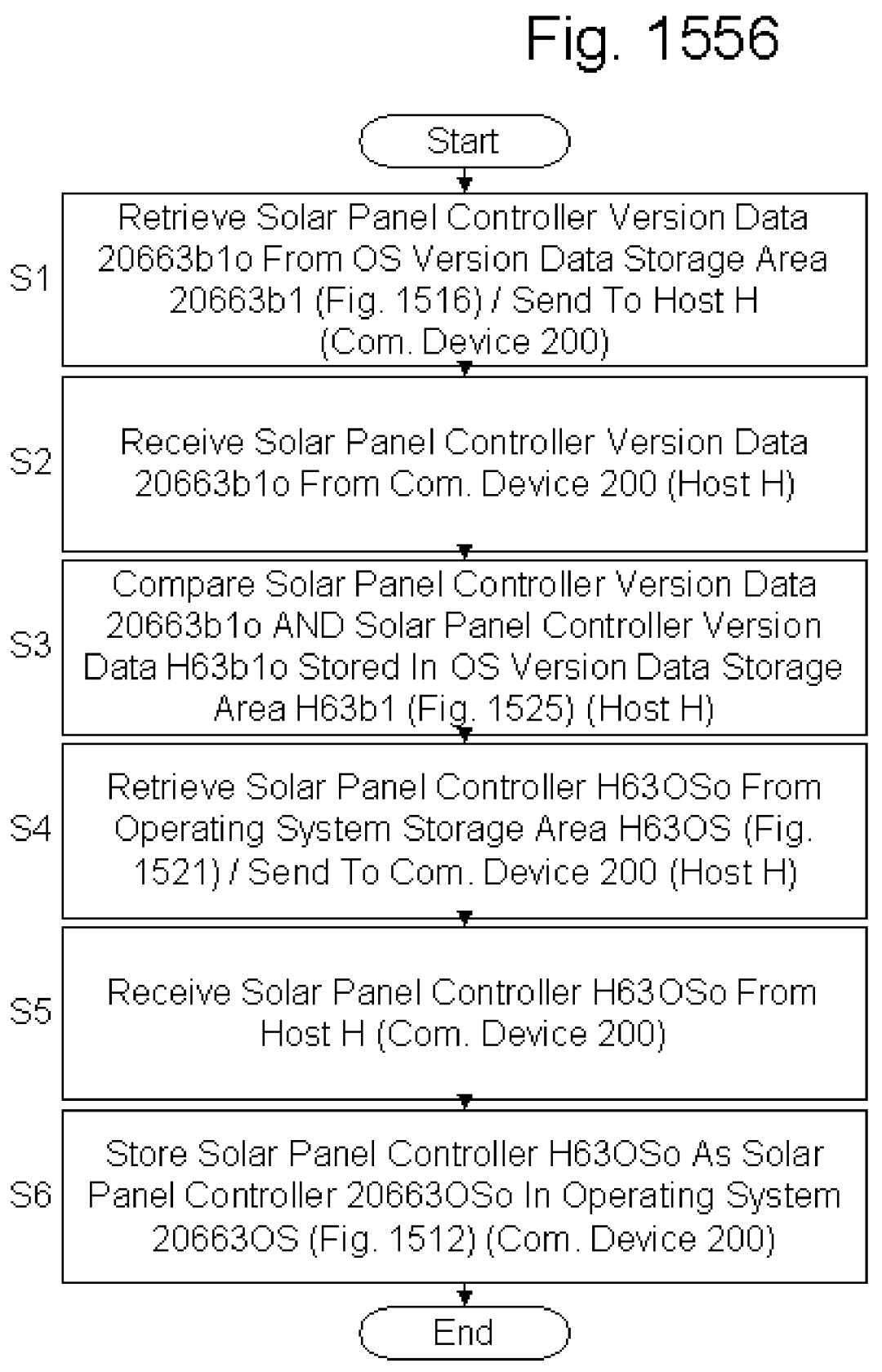

Fig. 1556

Start

S1 Retrieve Solar Panel Controller Version Data 20663b1o From OS Version Data Storage Area 20663b1 (Fig. 1516) / Send To Host H (Com. Device 200)

S2 Receive Solar Panel Controller Version Data 20663b1o From Com. Device 200 (Host H)

S3 Compare Solar Panel Controller Version Data 20663b1o AND Solar Panel Controller Version Data H63b1o Stored In OS Version Data Storage Area H63b1 (Fig. 1525) (Host H)

S4 Retrieve Solar Panel Controller H63OSo From Operating System Storage Area H63OS (Fig. 1521) / Send To Com. Device 200 (Host H)

S5 Receive Solar Panel Controller H63OSo From Host H (Com. Device 200)

S6 Store Solar Panel Controller H63OSo As Solar Panel Controller 20663OSo In Operating System 20663OS (Fig. 1512) (Com. Device 200)

End

Fig. 1557
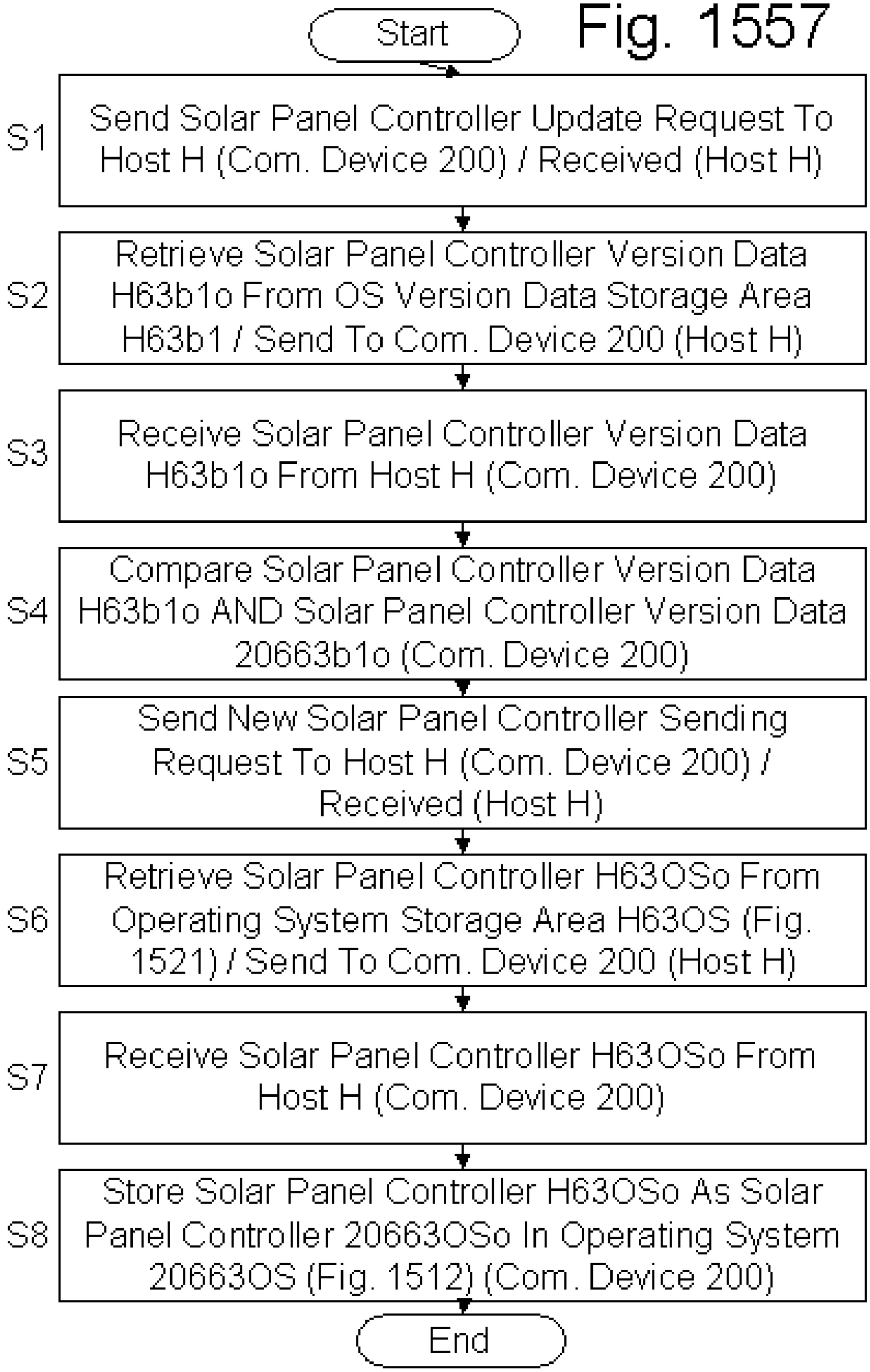

Fig. 1558
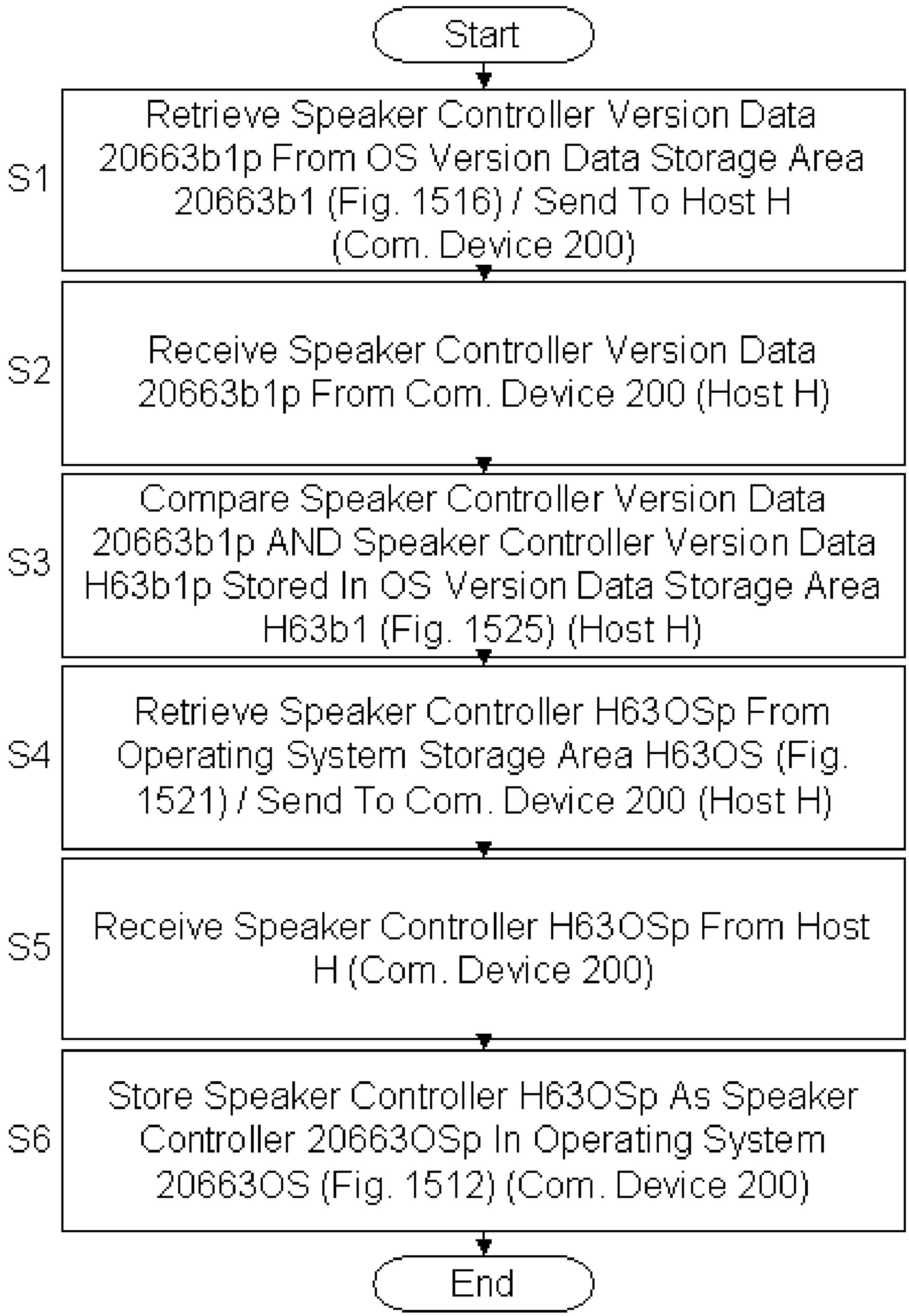

Fig. 1559
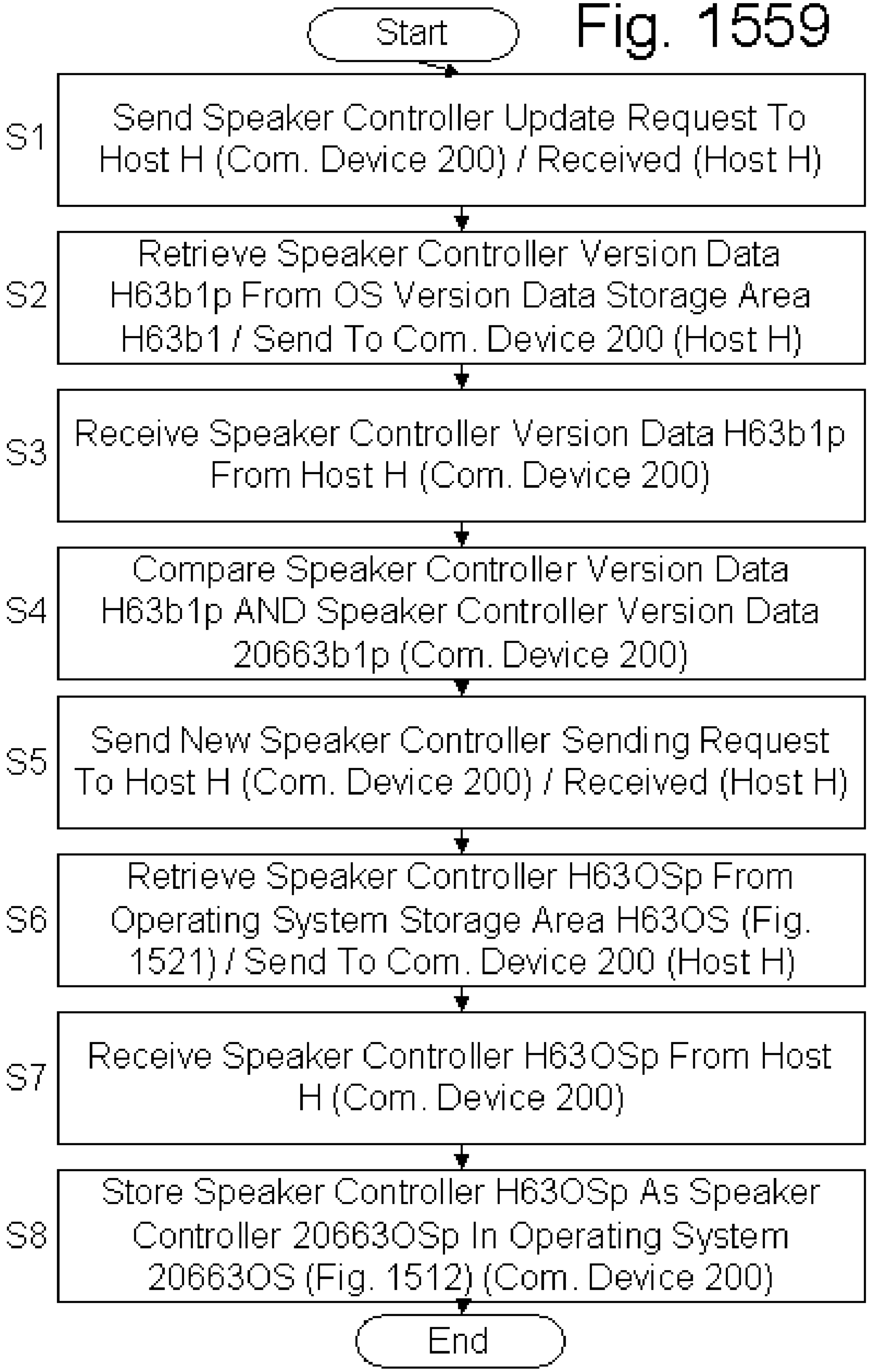

Fig. 1560
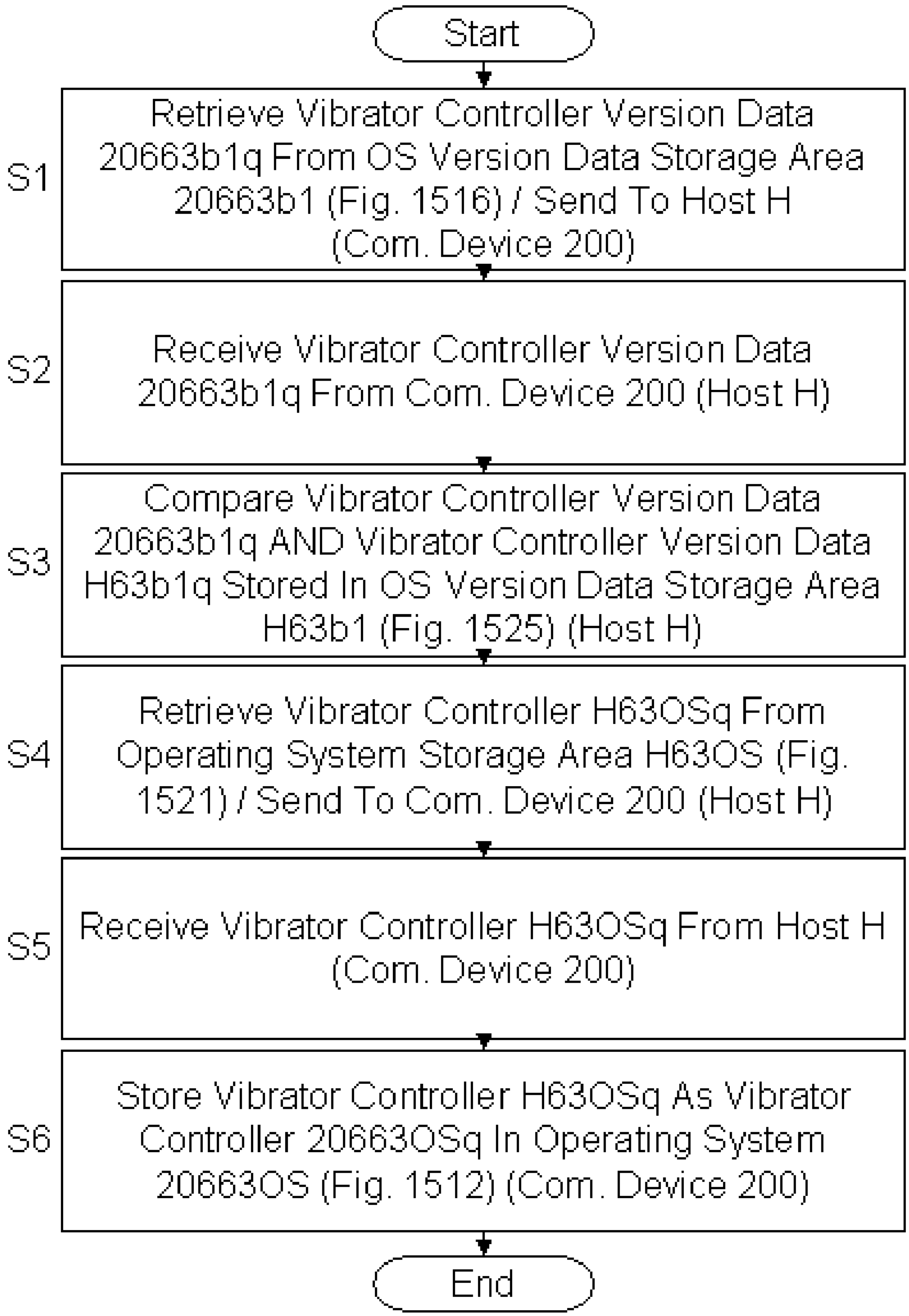

Fig. 1561
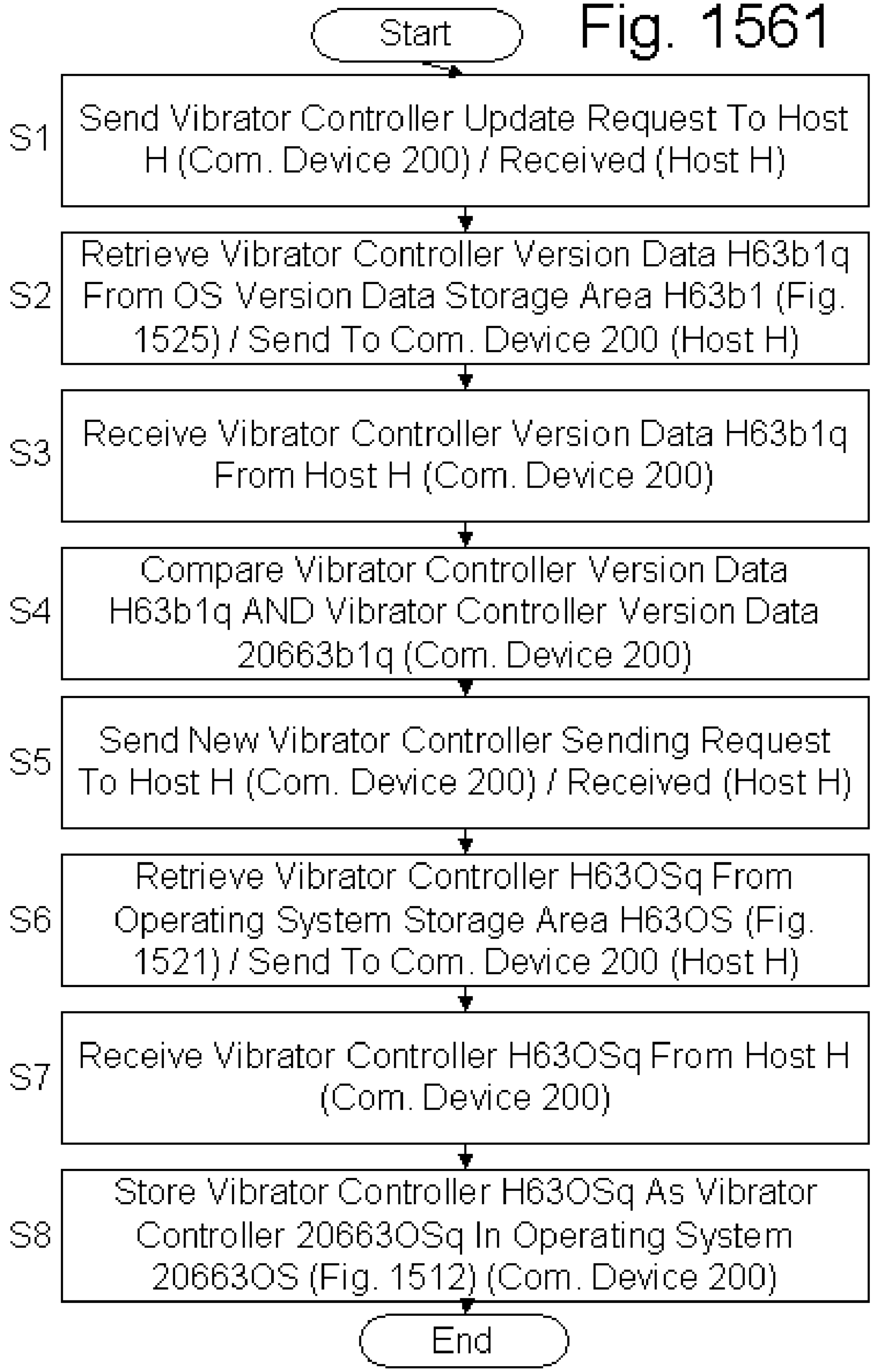

Fig. 1562
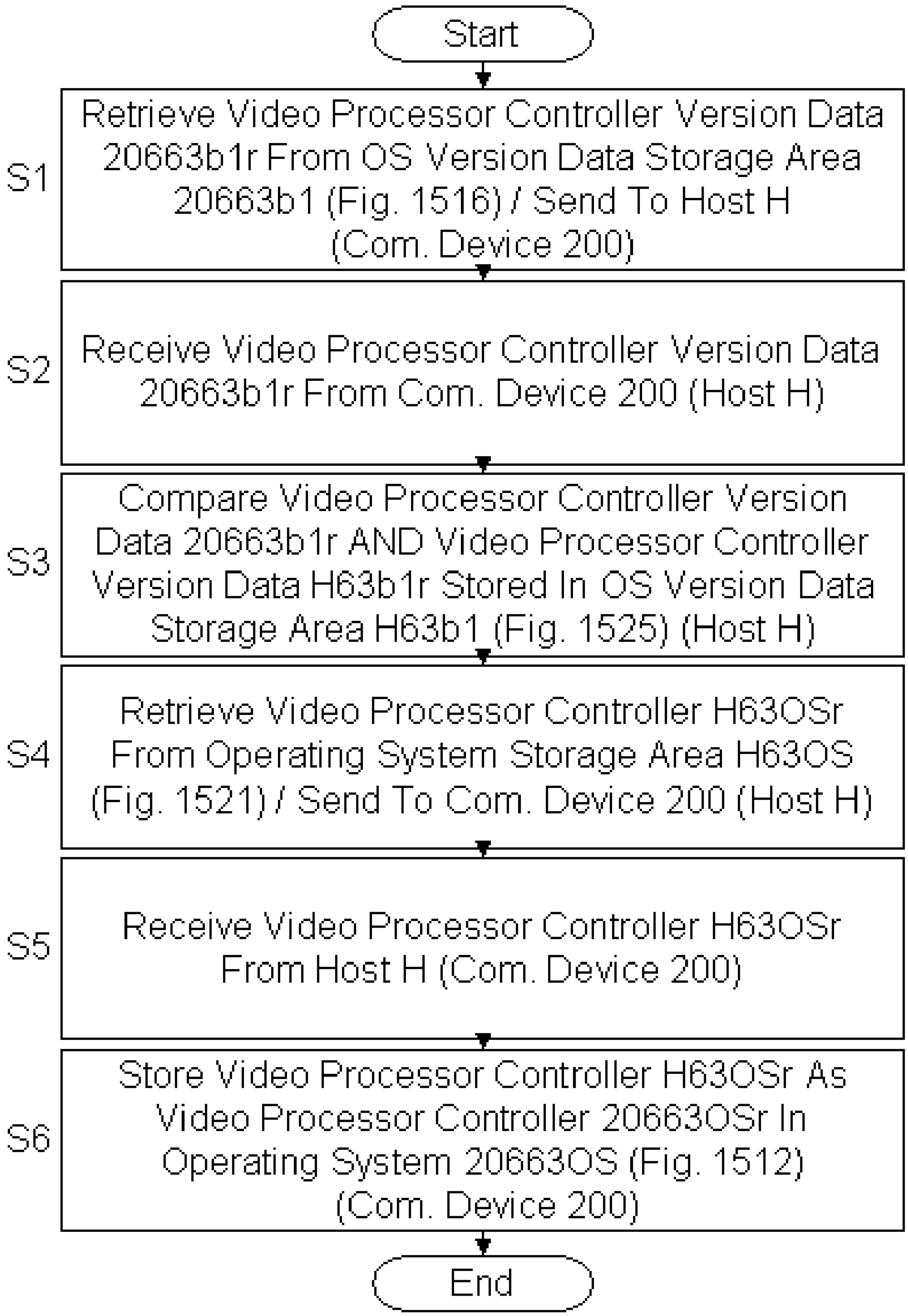

Fig. 1563
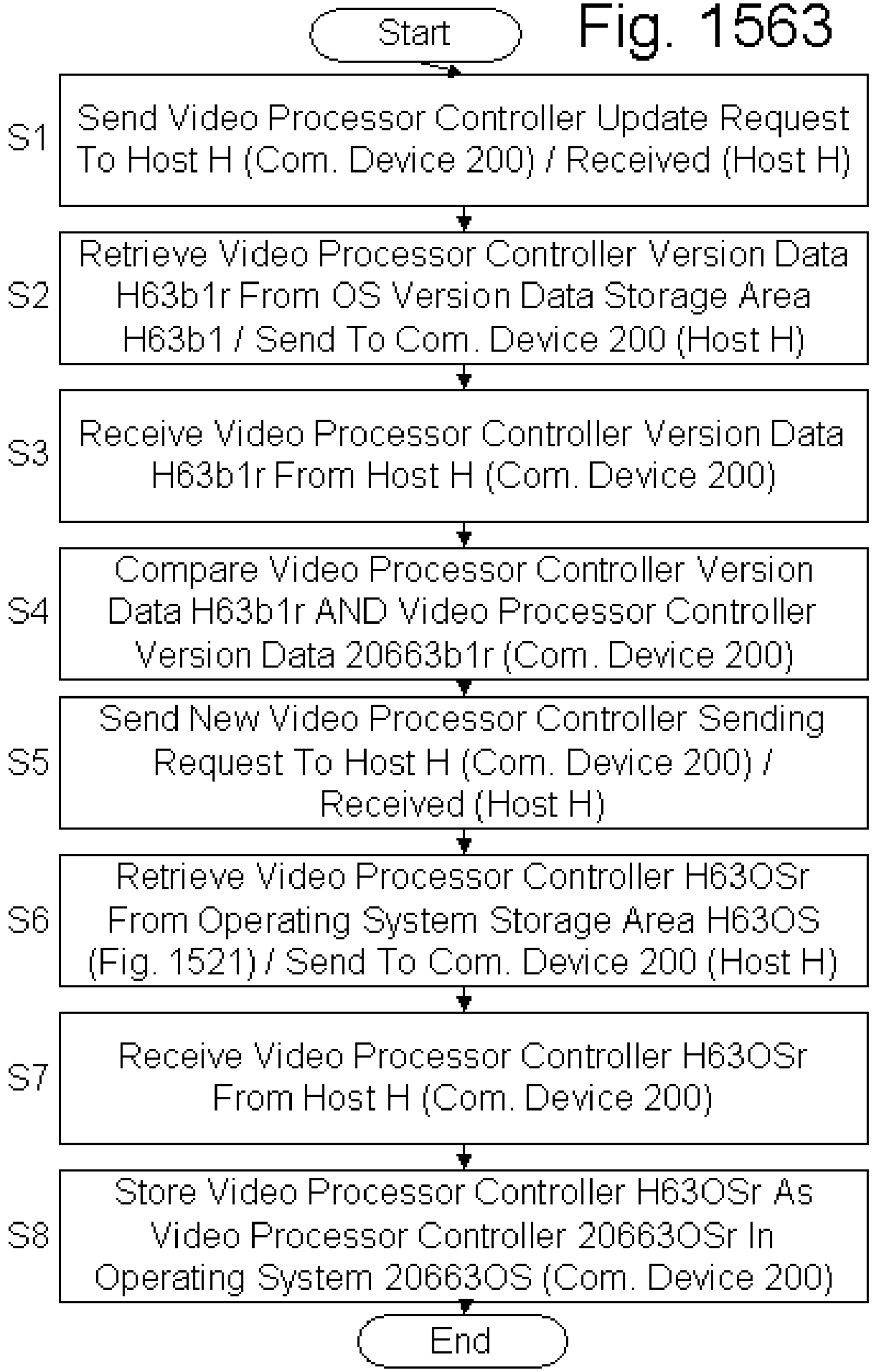

Fig. 1564
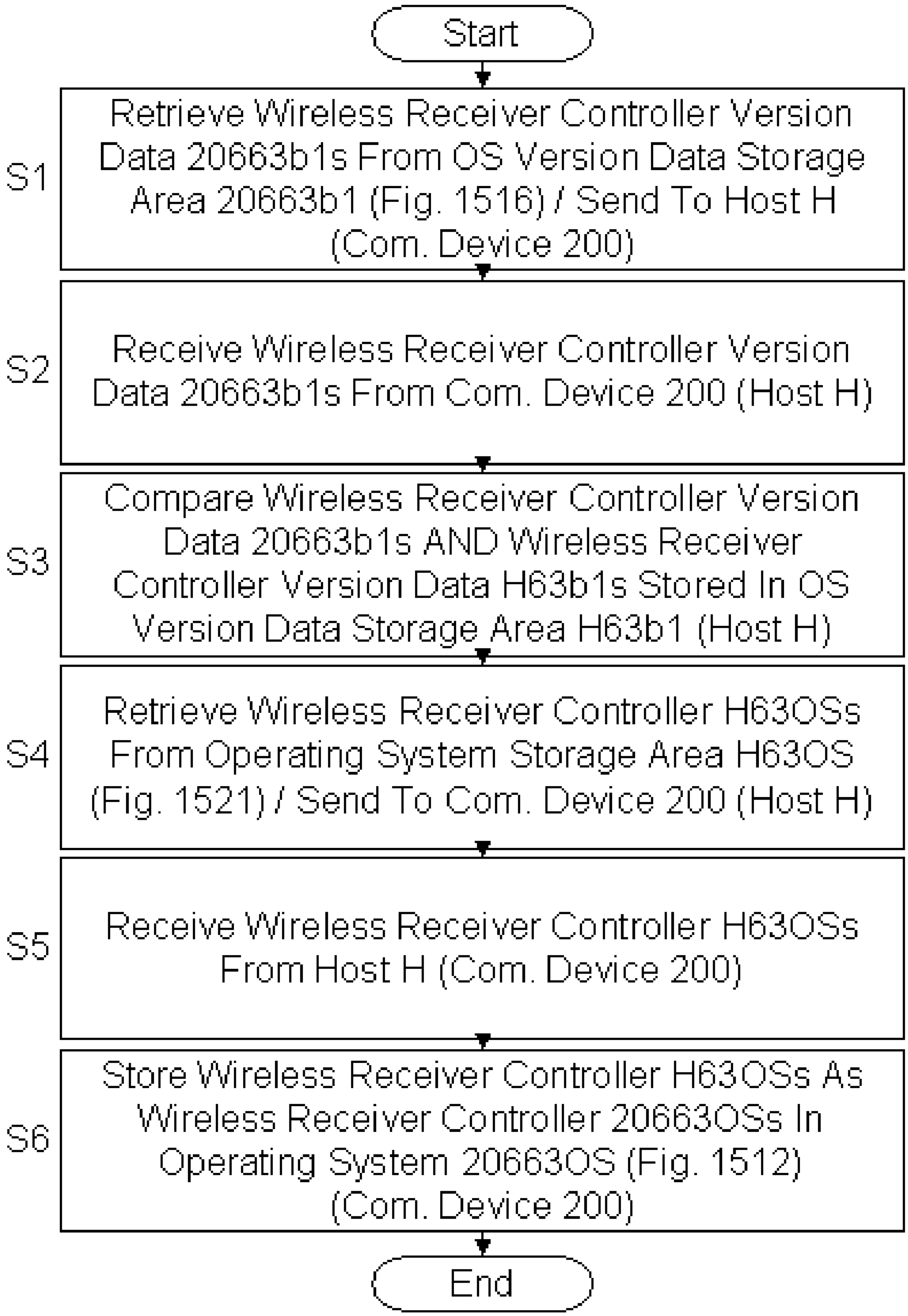

Fig. 1565
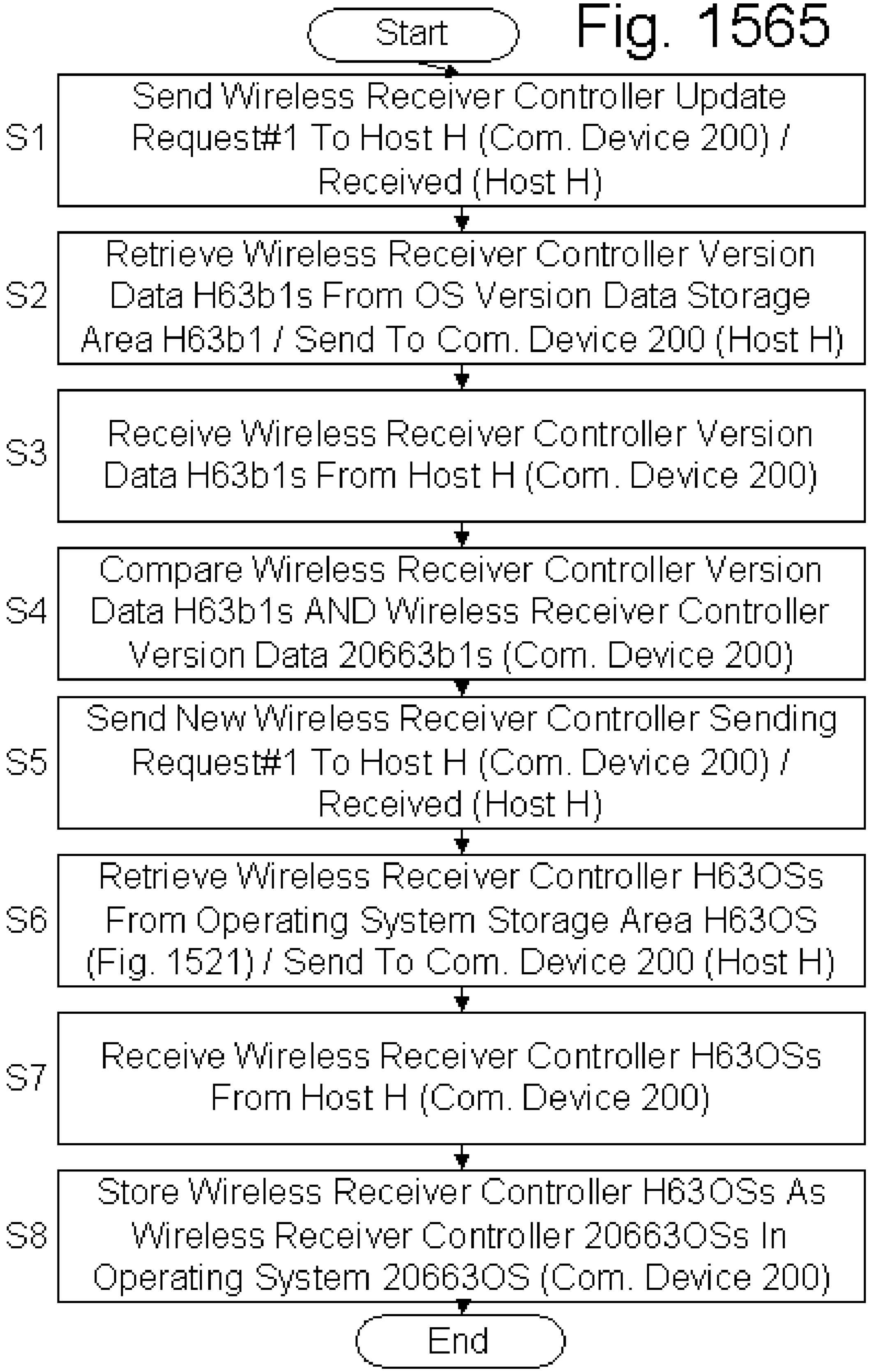

Fig. 1566
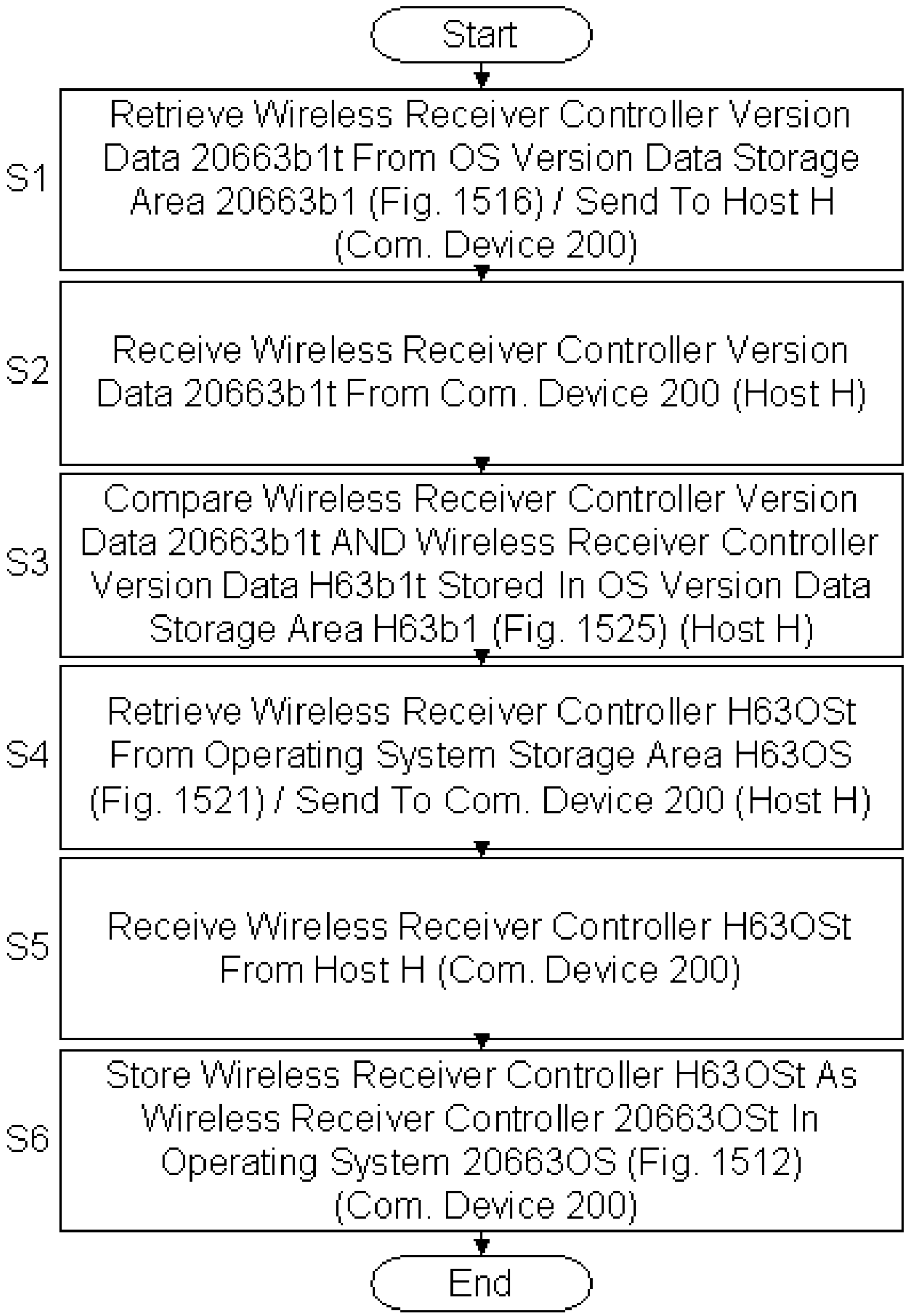

Fig. 1567
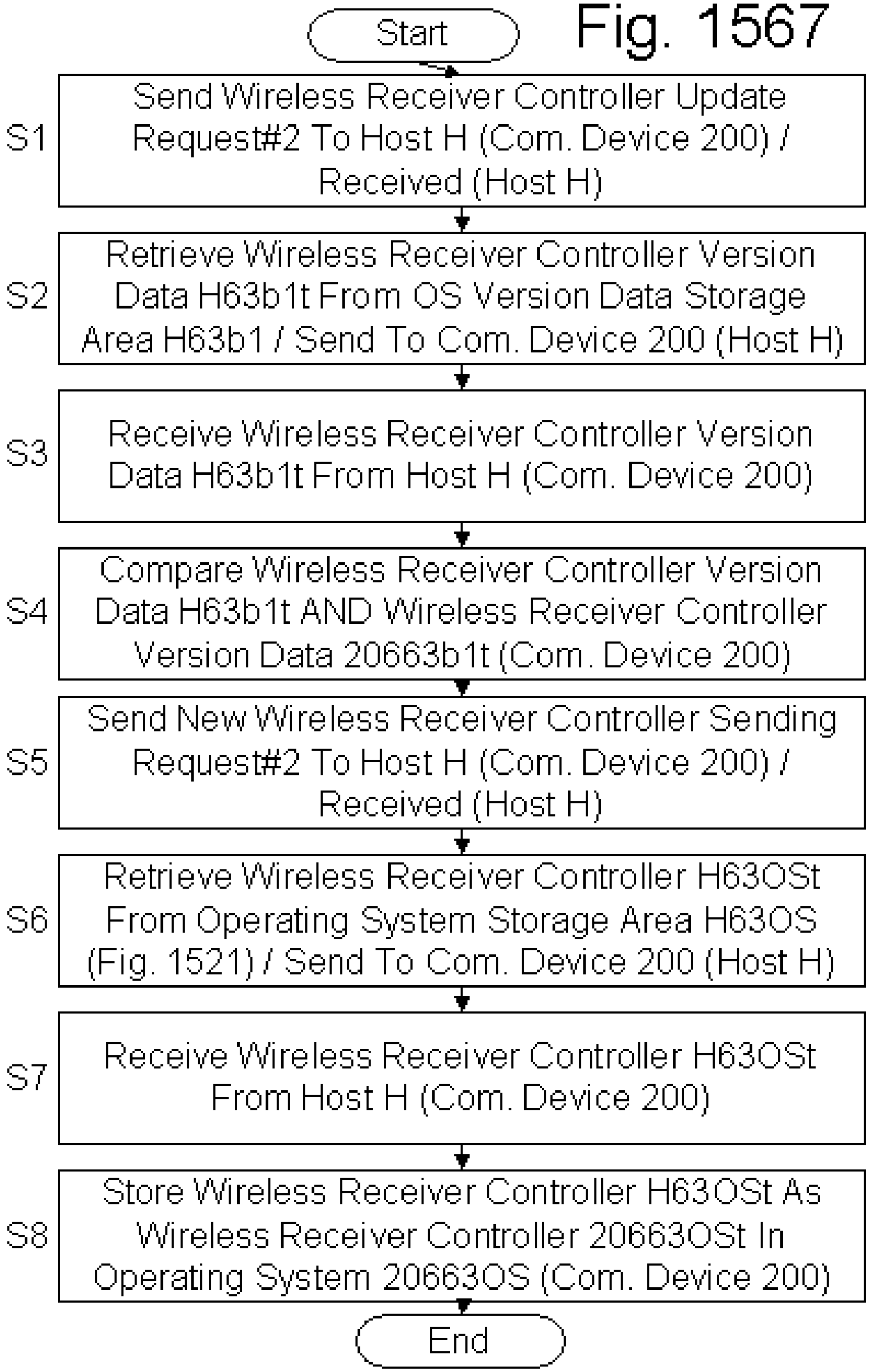

Fig. 1568
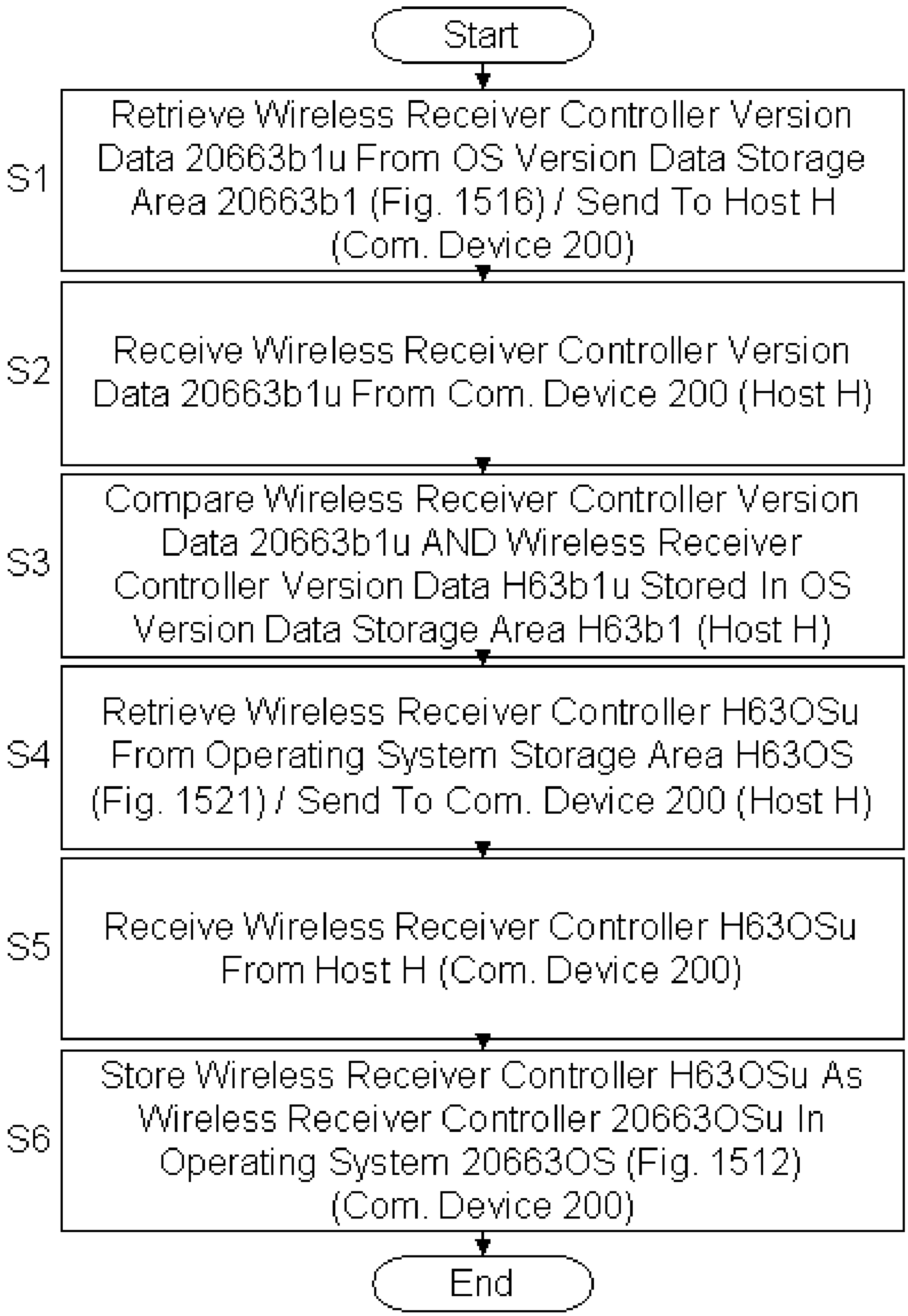

Fig. 1569
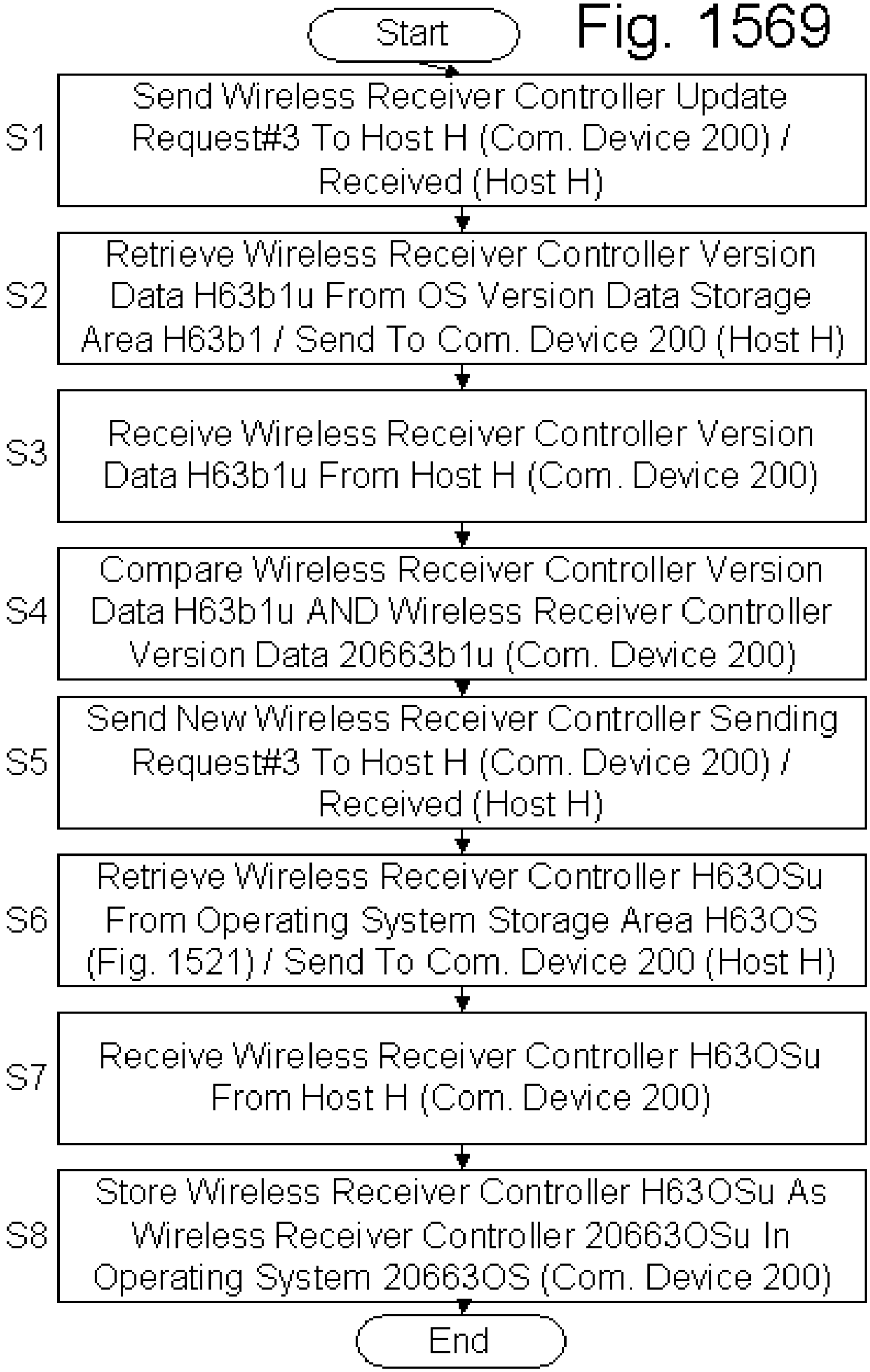

Fig. 1570
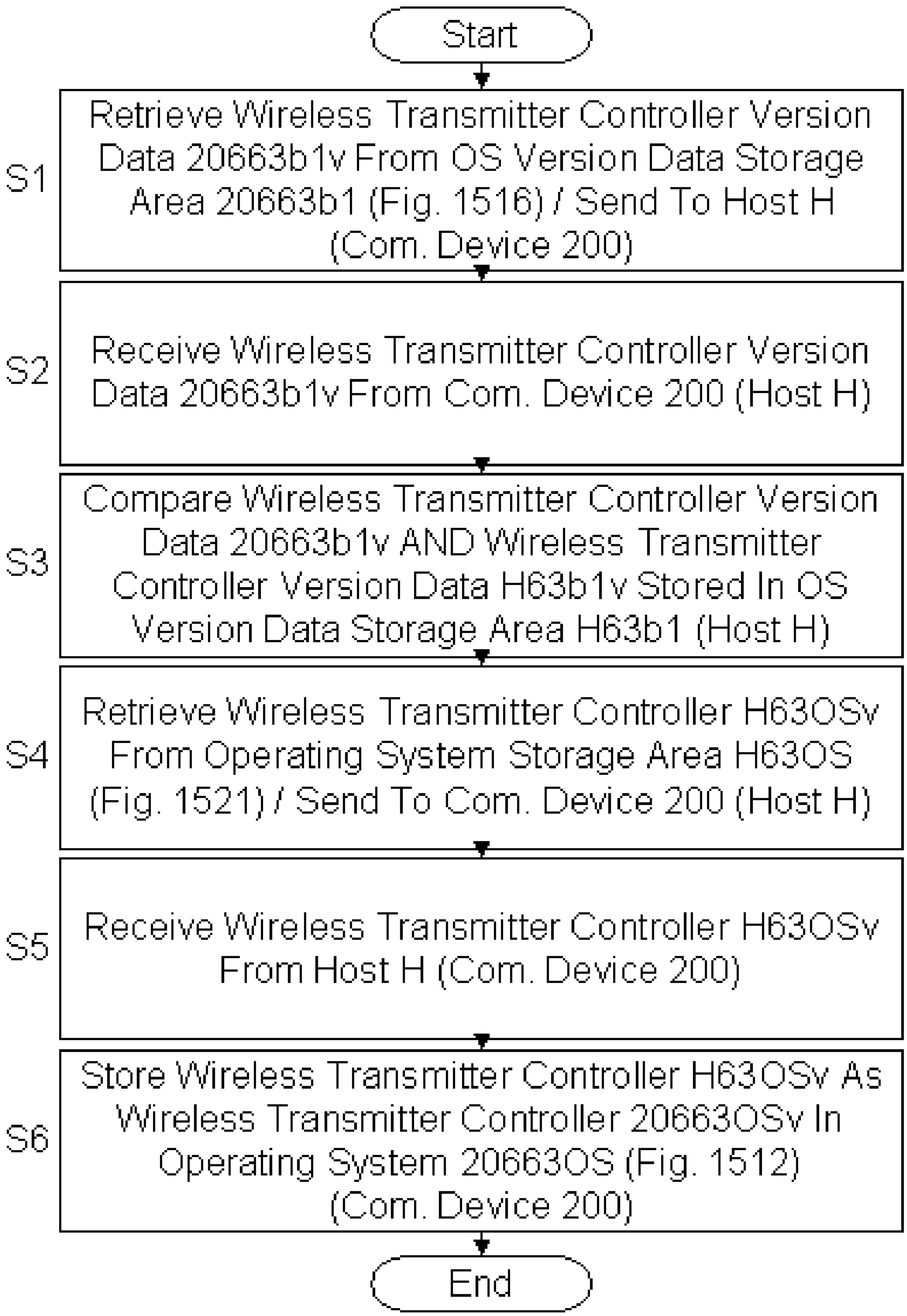

Fig. 1571
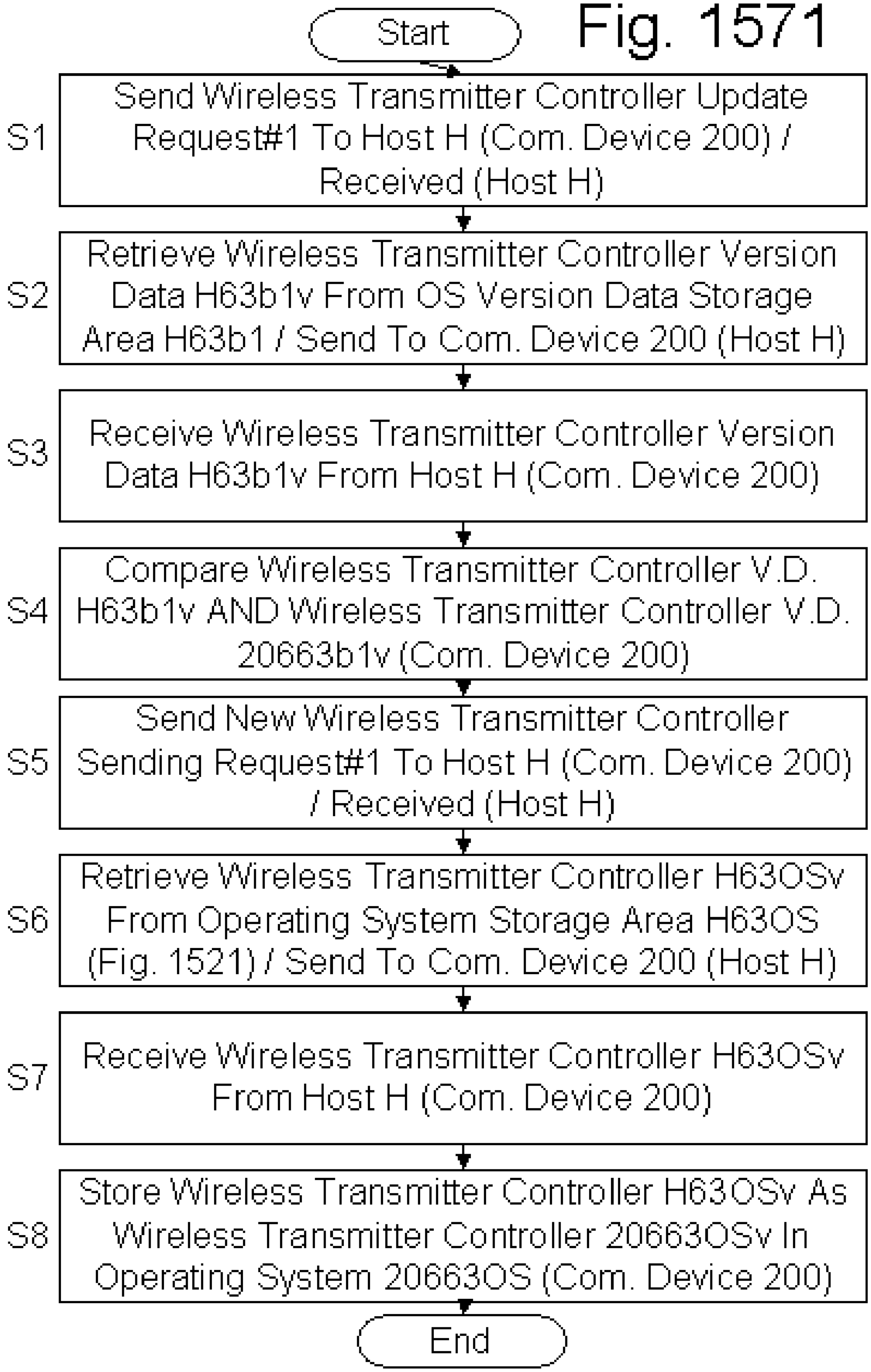

Fig. 1572
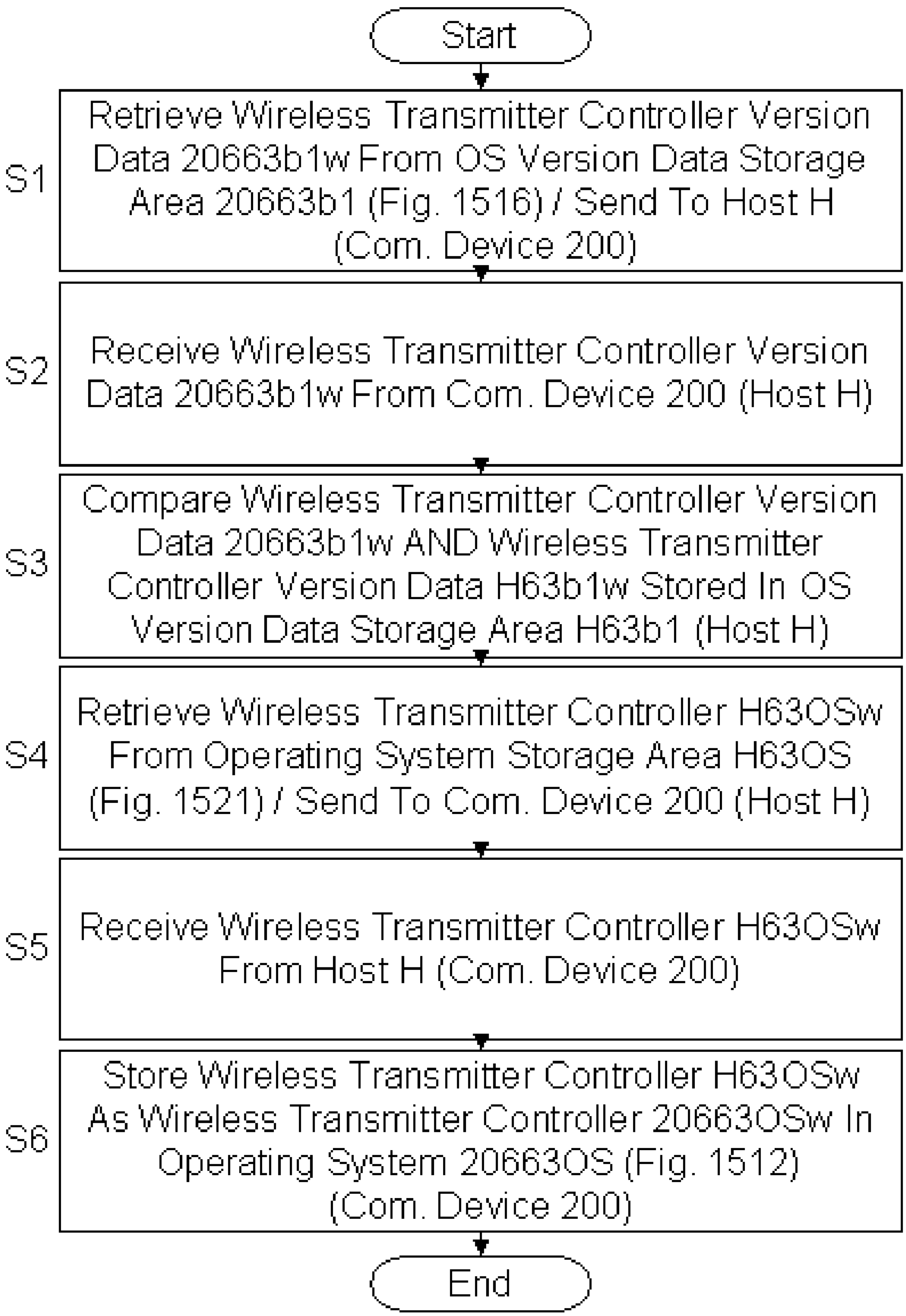

Fig. 1573
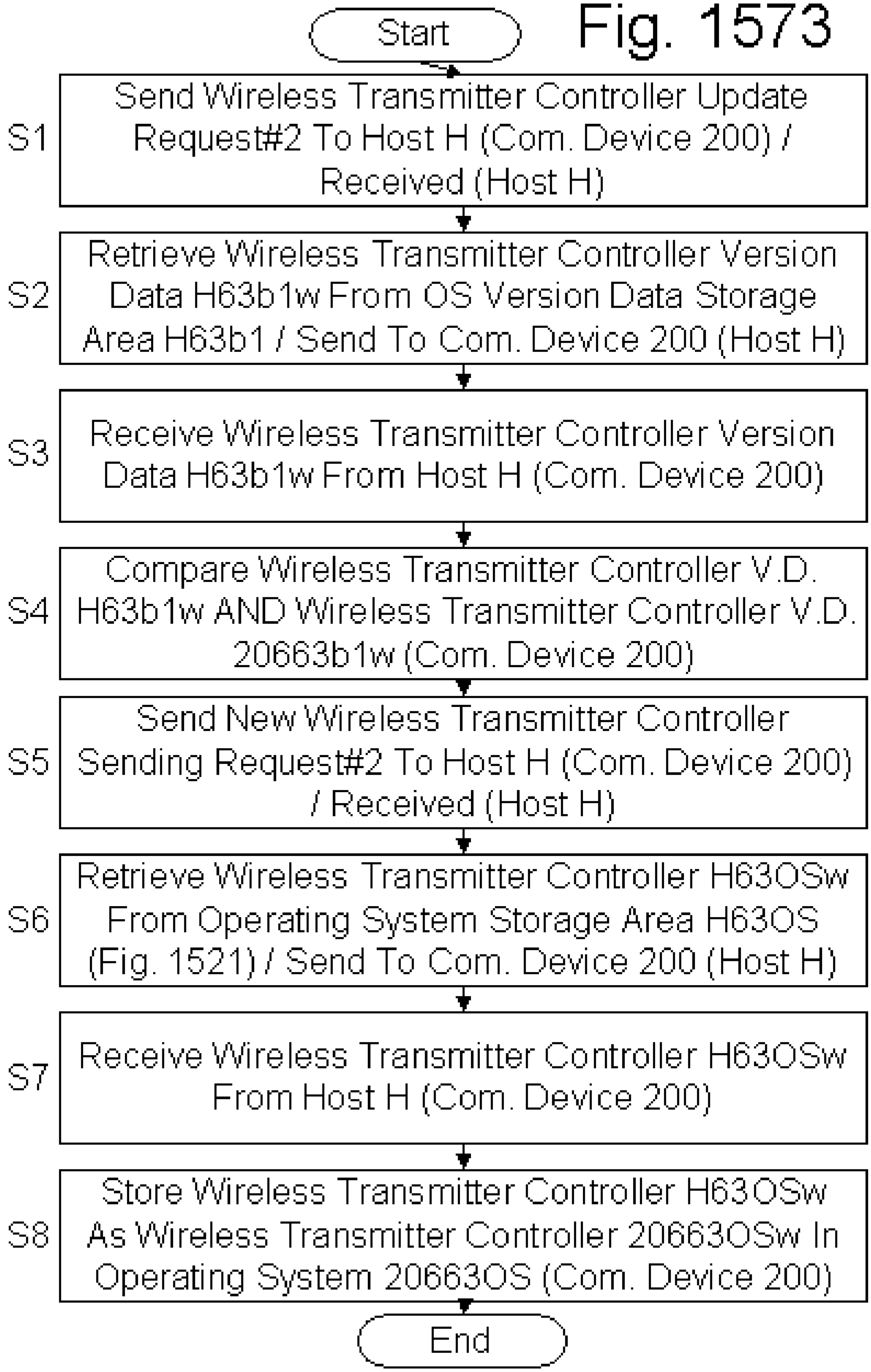

Fig. 1574
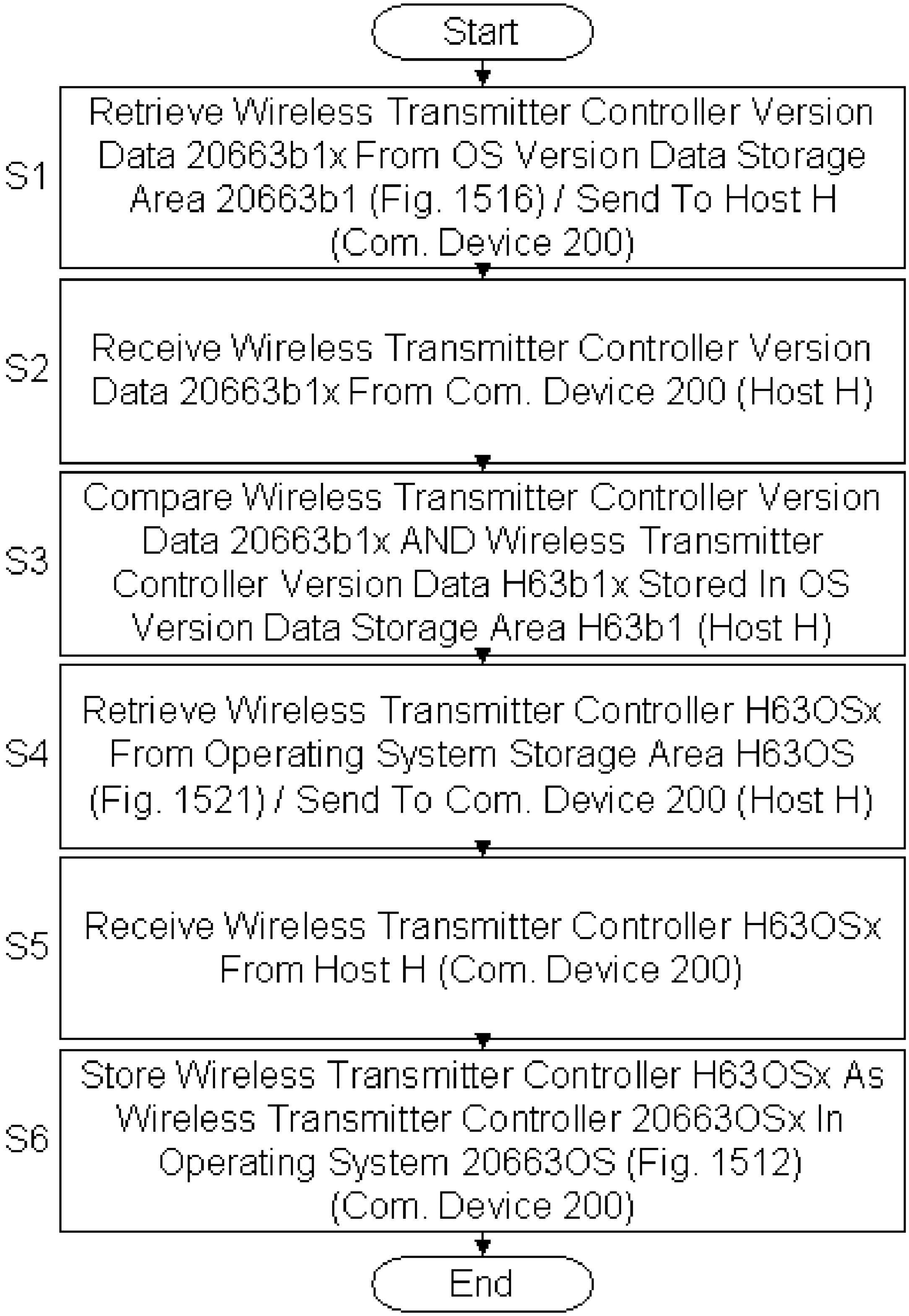

Fig. 1575
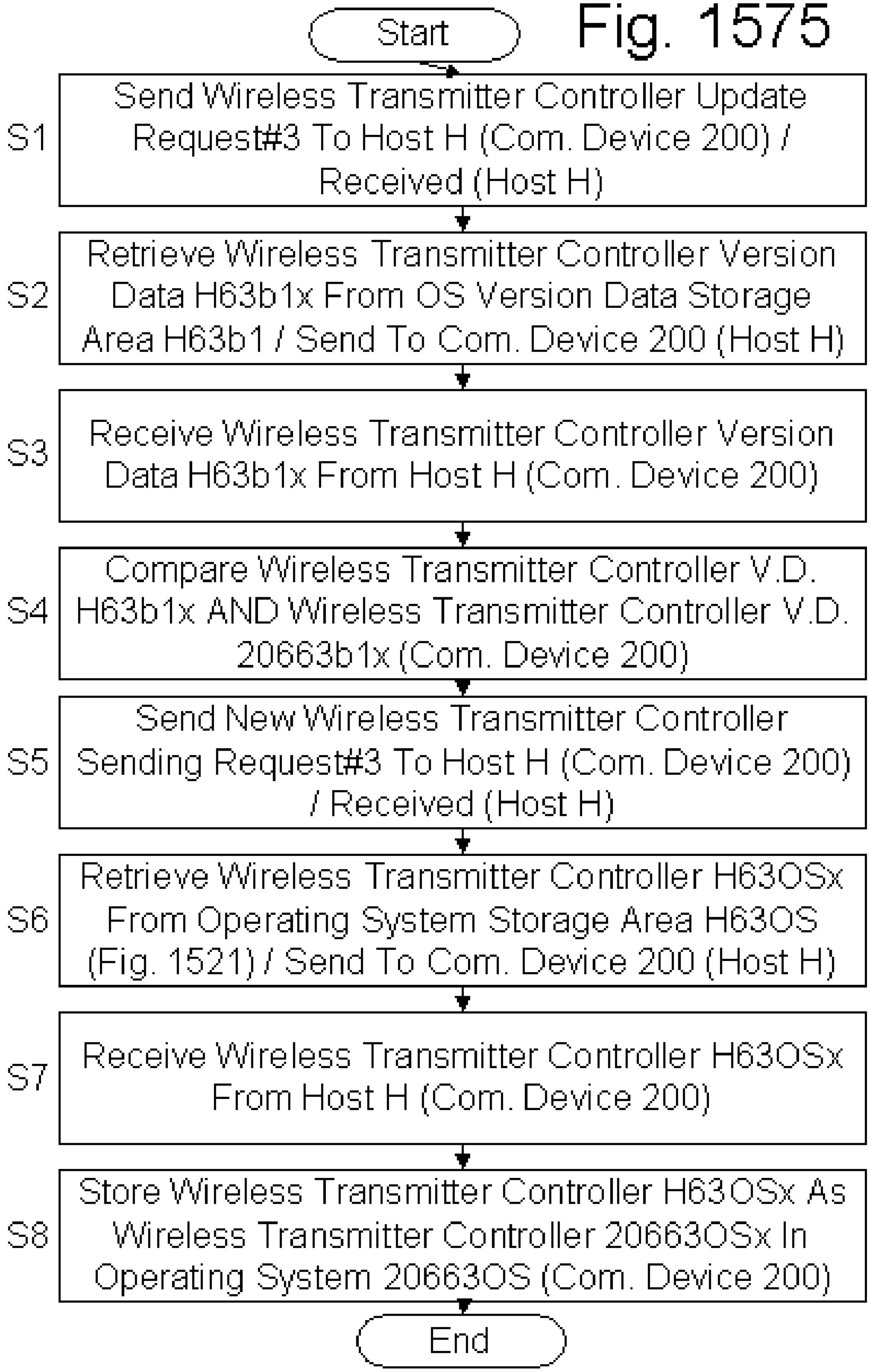

Fig. 1576
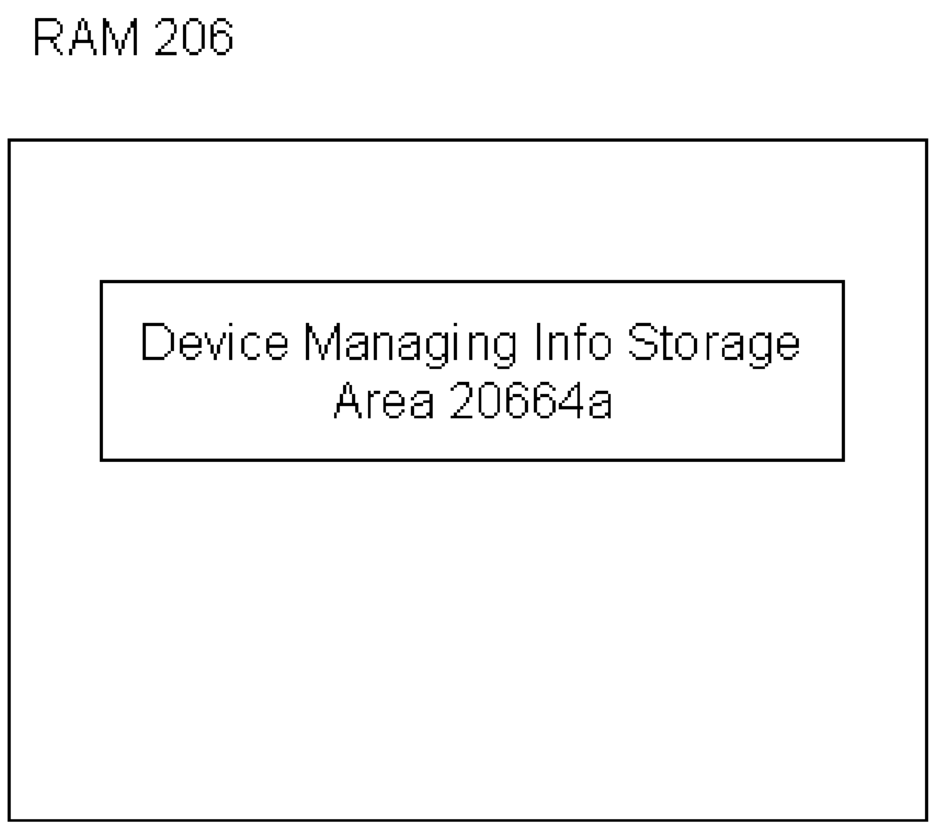

Fig. 1577
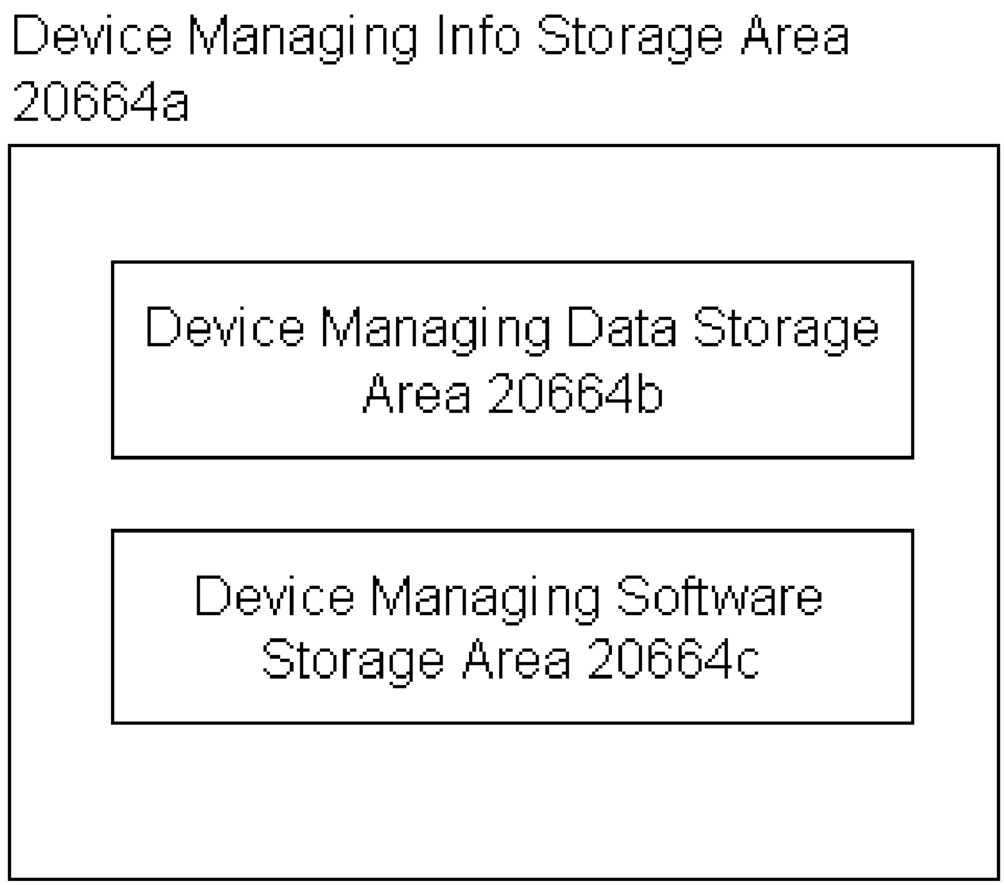

Fig. 1578
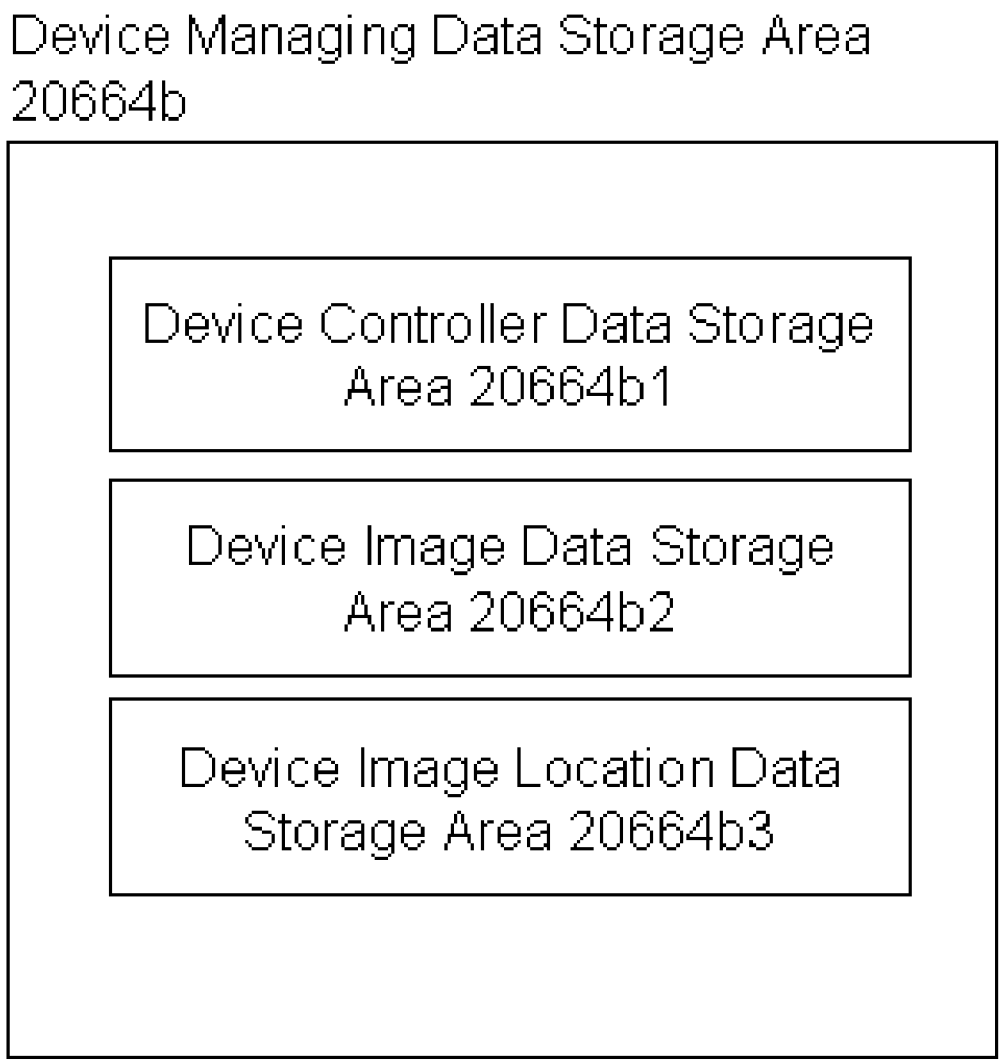

Fig. 1579

Device Controller Data Storage Area
20664b1

| Device Controller ID | Device Controller Data |
|---|---|
| Device Controller#1 | Device Controller Data#1 |
| Device Controller#2 | Device Controller Data#2 |
| Device Controller#3 | Device Controller Data#3 |
| Device Controller#4 | Device Controller Data#4 |
| Device Controller#5 | Device Controller Data#5 |

Fig. 1580

Device Image Data Storage Area
20664b2

| Device Controller ID | Device Image Data |
|---|---|
| Device Controller#1 | Device Image Data#1 |
| Device Controller#2 | Device Image Data#2 |
| Device Controller#3 | Device Image Data#3 |
| Device Controller#4 | Device Image Data#4 |
| Device Controller#5 | Device Image Data#5 |

Fig. 1581

Device Image Location Data Storage Area 20664b3

| Device Controller ID | Device Image Location Data |
|---|---|
| Device Controller#1 | Device Image Location Data#1 |
| Device Controller#2 | Device Image Location Data#2 |
| Device Controller#3 | Device Image Location Data#3 |
| Device Controller#4 | Device Image Location Data#4 |
| Device Controller#5 | Device Image Location Data#5 |

Fig. 1582
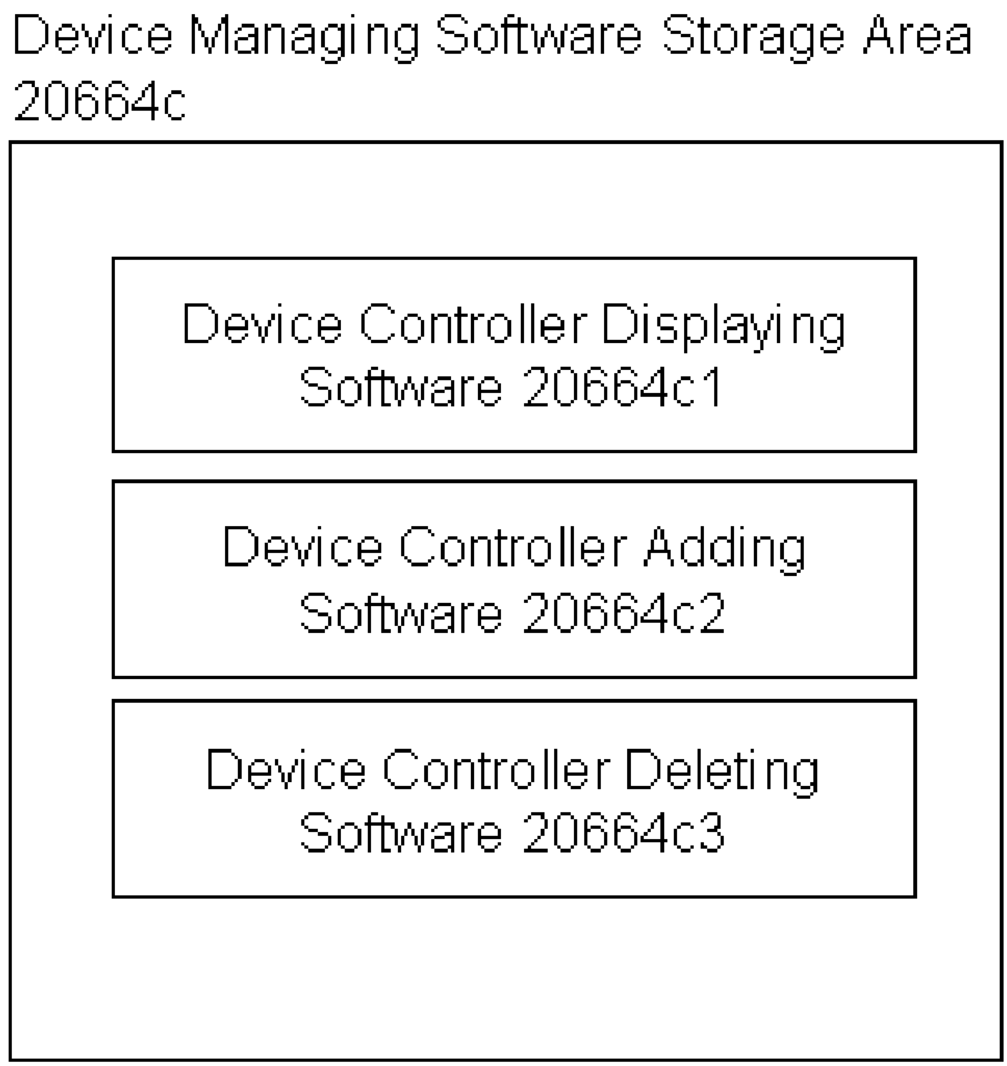

Fig. 1583
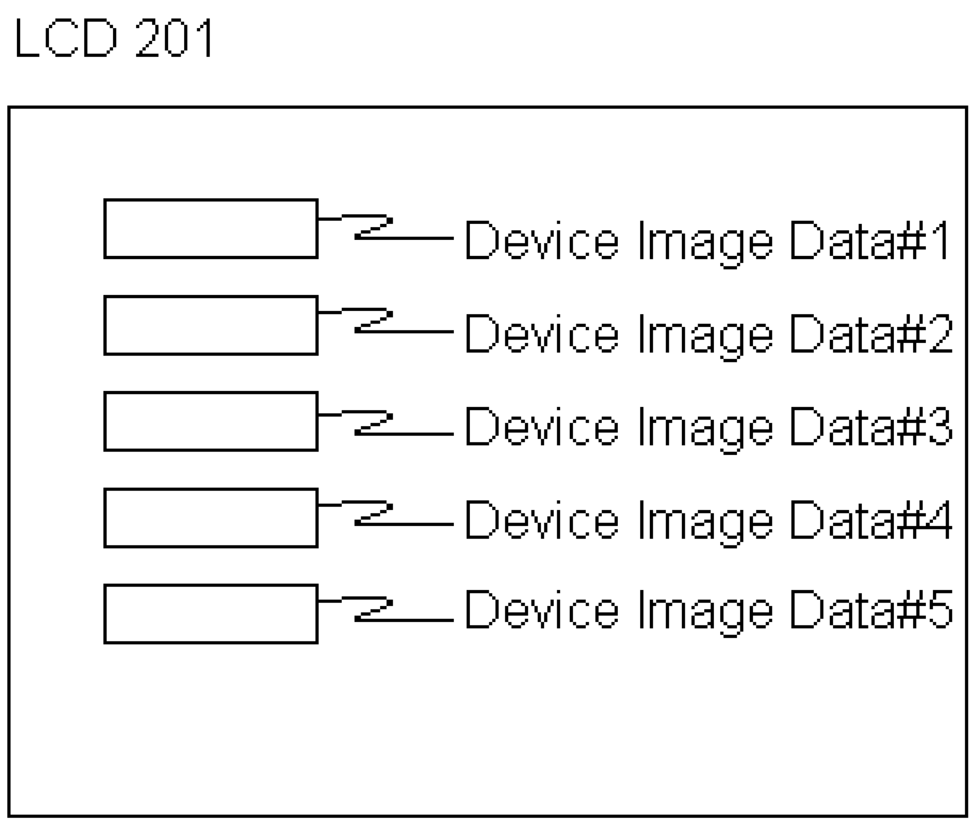

Fig. 1584
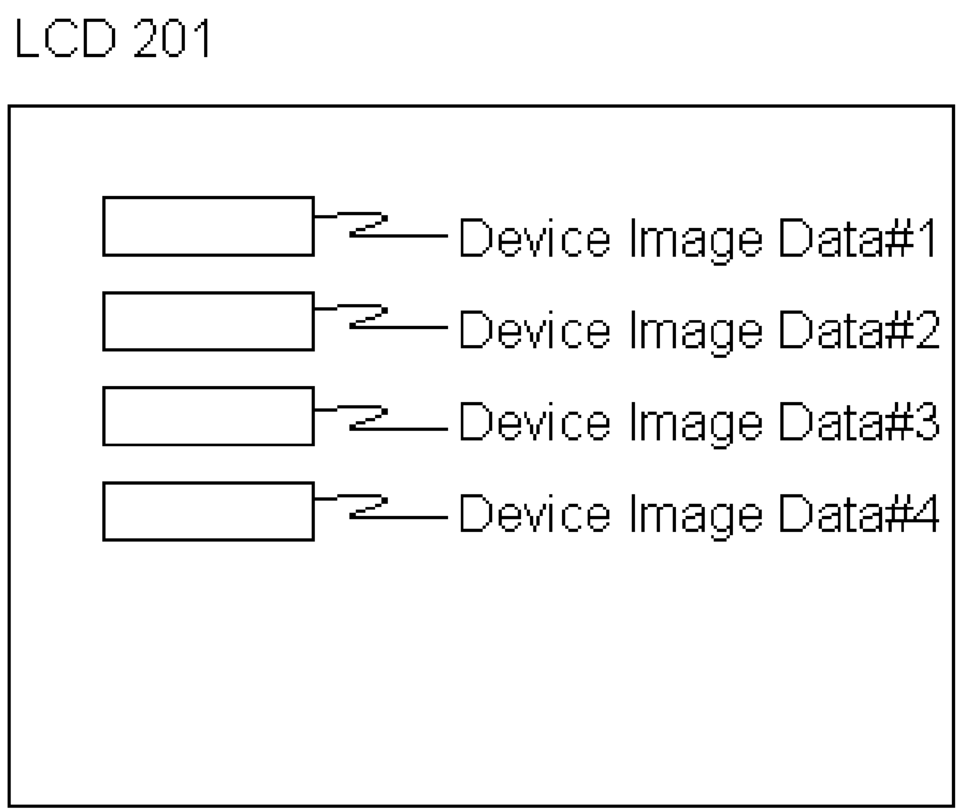

Fig. 1585
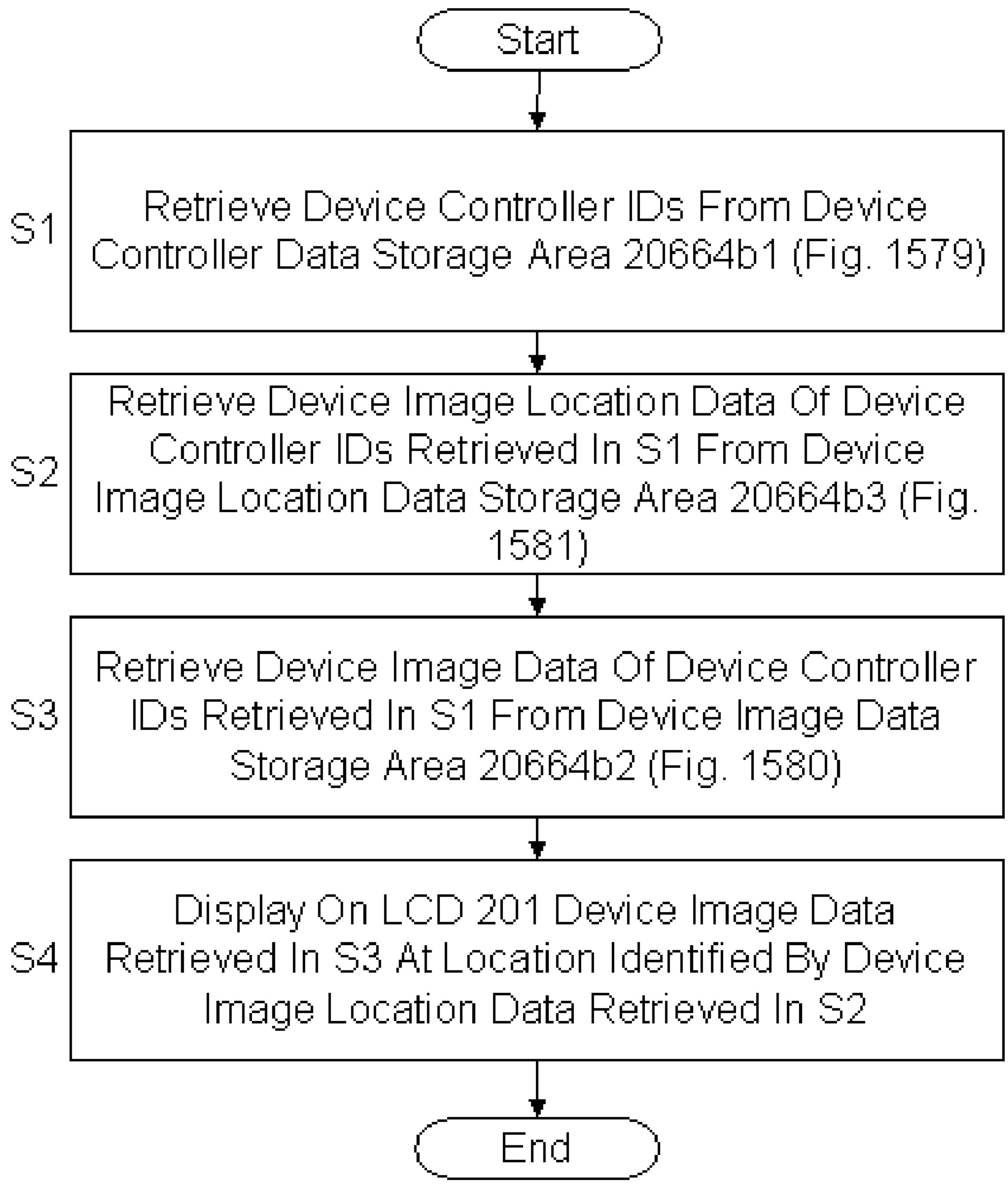

Fig. 1586
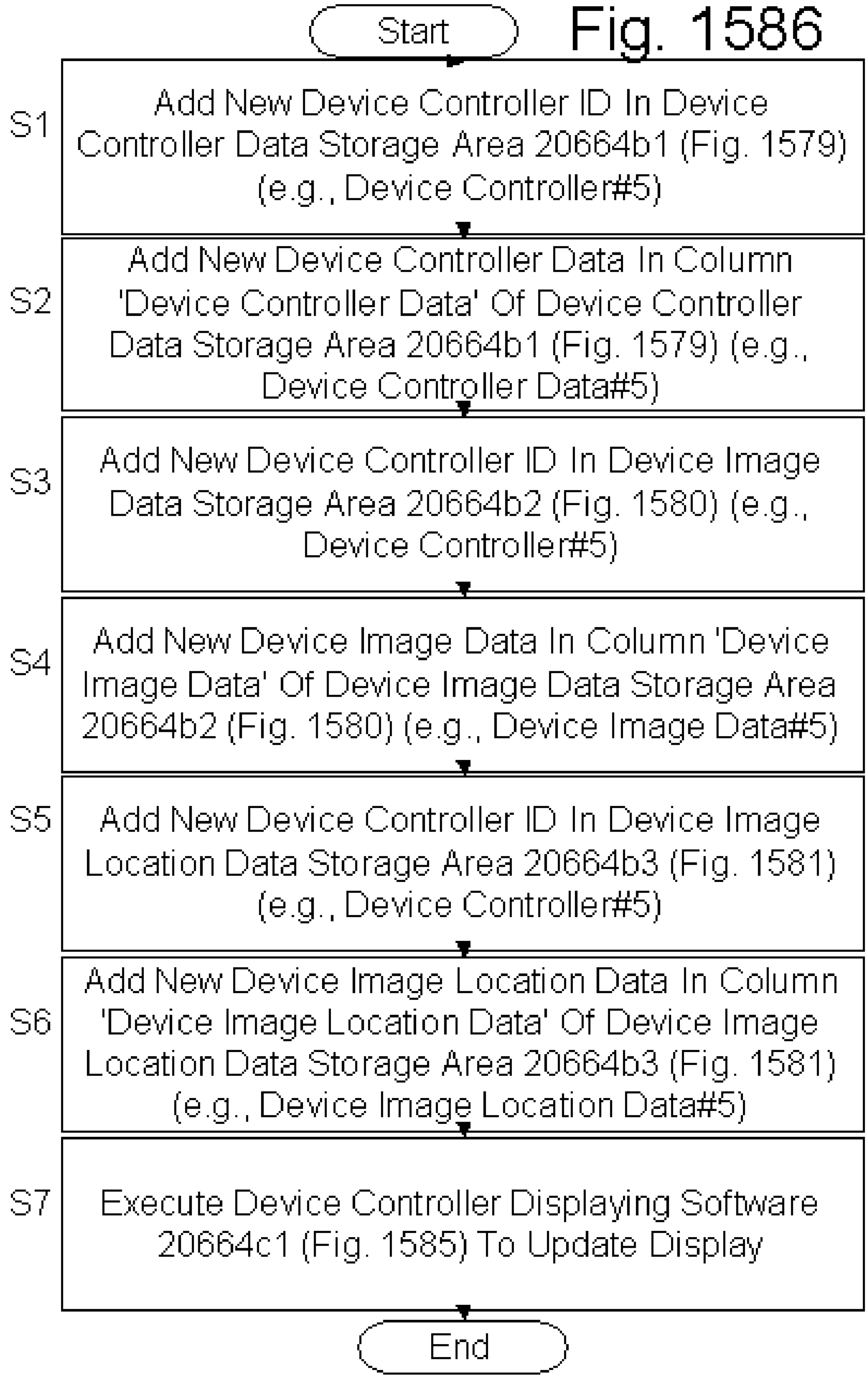

Fig. 1587
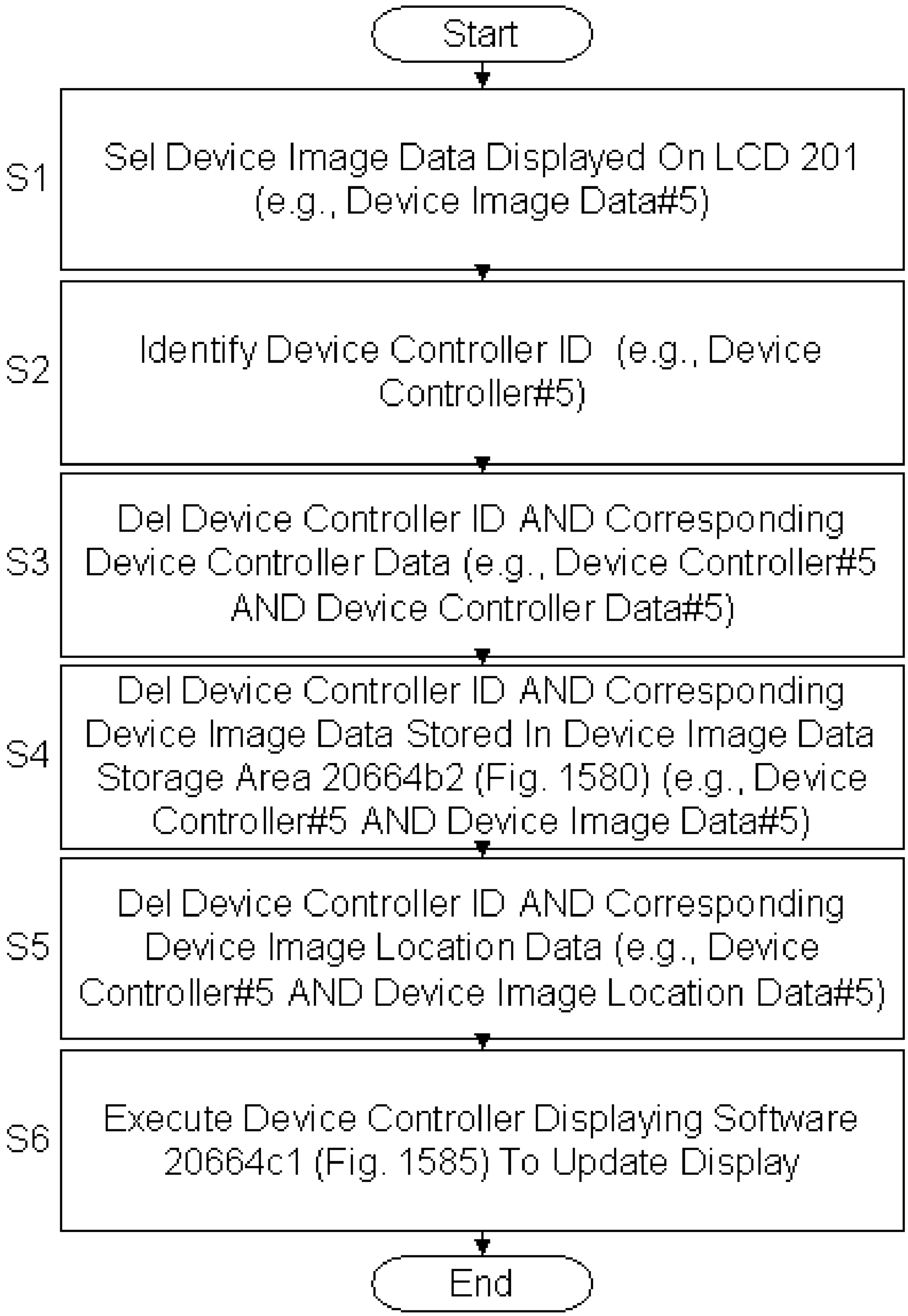

Fig. 1588
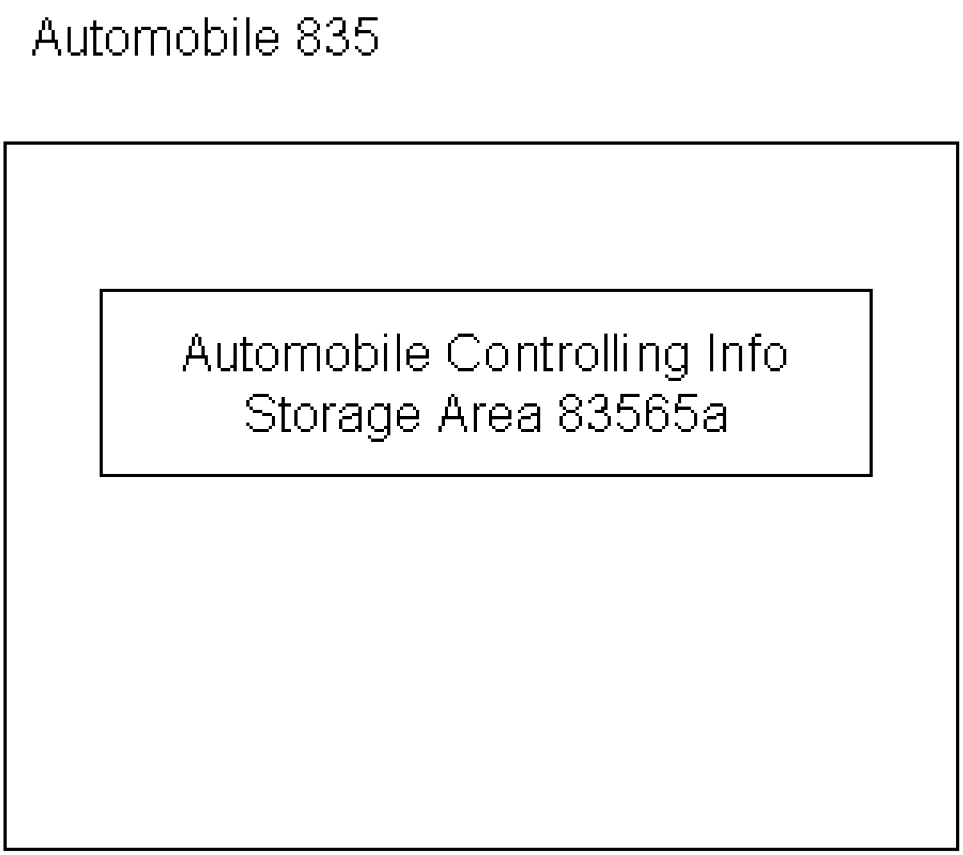

Fig. 1589
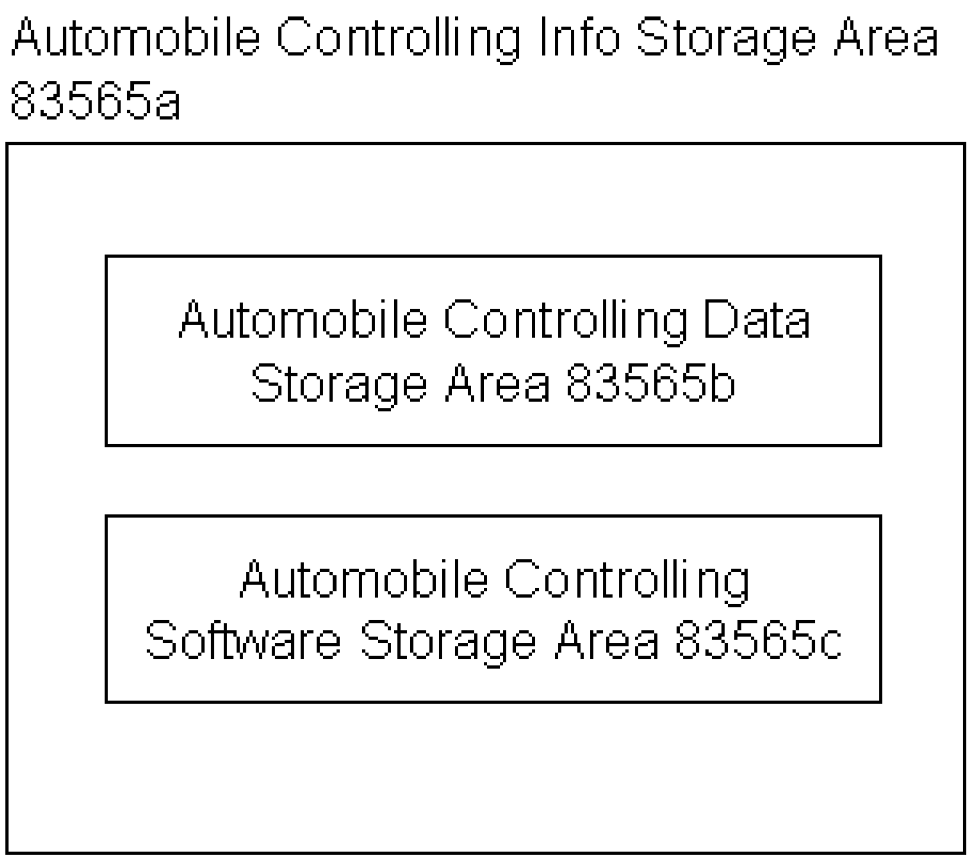

Fig. 1590
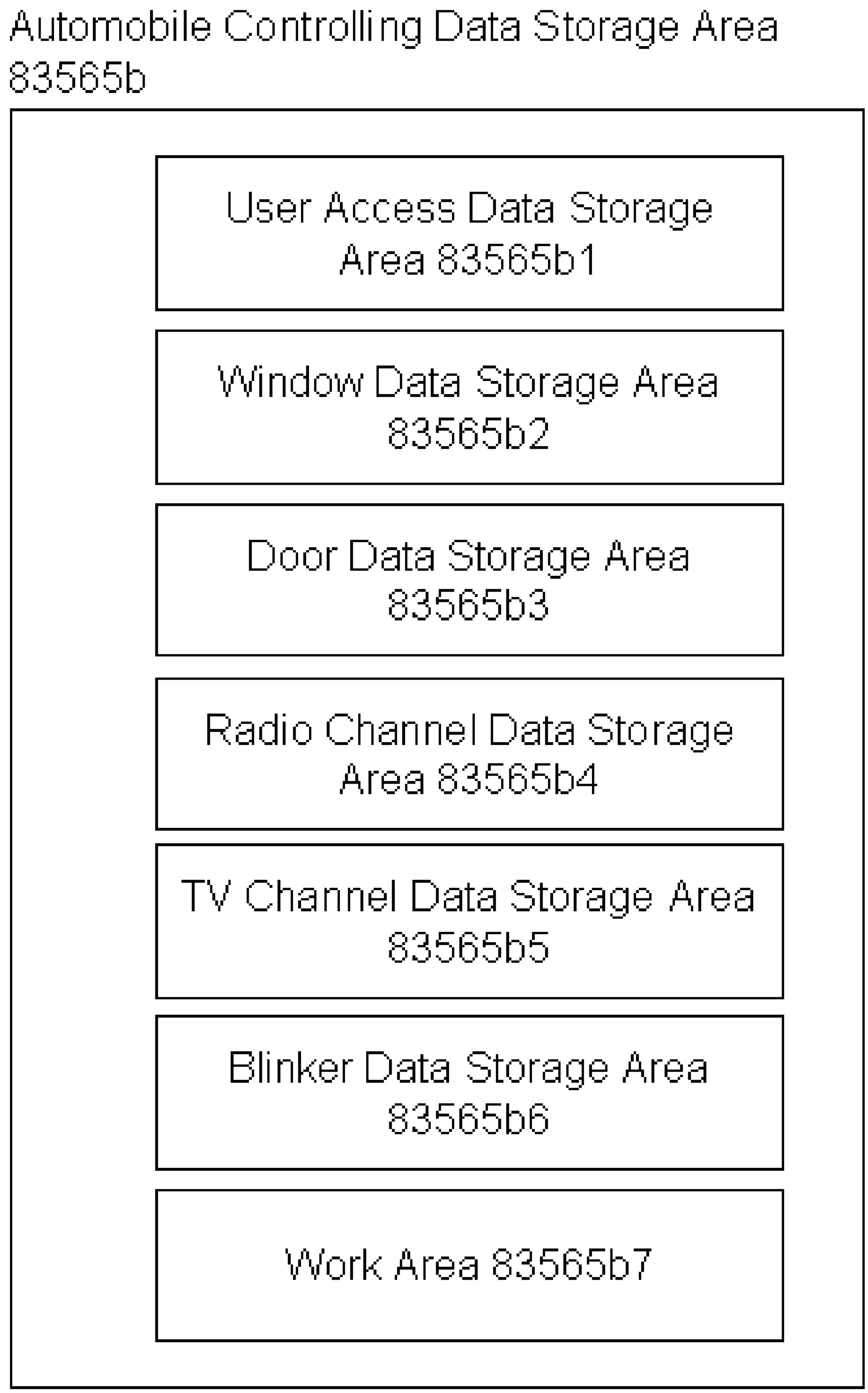

Fig. 1591

User Access Data Storage Area 83565b1

| User ID | Password Data |
|---|---|
| User#1 | Password Data#1 |
| User#2 | Password Data#2 |
| User#3 | Password Data#3 |
| User#4 | Password Data#4 |

Fig. 1592

Window Data Storage Area 83565b2

| Window ID | Window Data |
|---|---|
| Window#1 | Window Data#1 |
| Window#2 | Window Data#2 |
| Window#3 | Window Data#3 |
| Window#4 | Window Data#4 |

Fig. 1593

Door Data Storage Area 83565b3

| Door ID | Door Data |
|---|---|
| Door#1 | Door Data#1 |
| Door#2 | Door Data#2 |
| Door#3 | Door Data#3 |
| Door#4 | Door Data#4 |

Fig. 1594

Radio Channel Data Storage Area
83565b4

| Radio Channel ID | Radio Channel Data |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Fig. 1595

TV Channel Data Storage Area
83565b5

| TV Channel ID | TV Channel Data |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Fig. 1596

Blinker Data Storage Area 83565b6

| Blinker ID | Blinker Data |
|---|---|
| Blinker#1 | Blinker Data#1 |
| Blinker#2 | Blinker Data#2 |

Fig. 1597
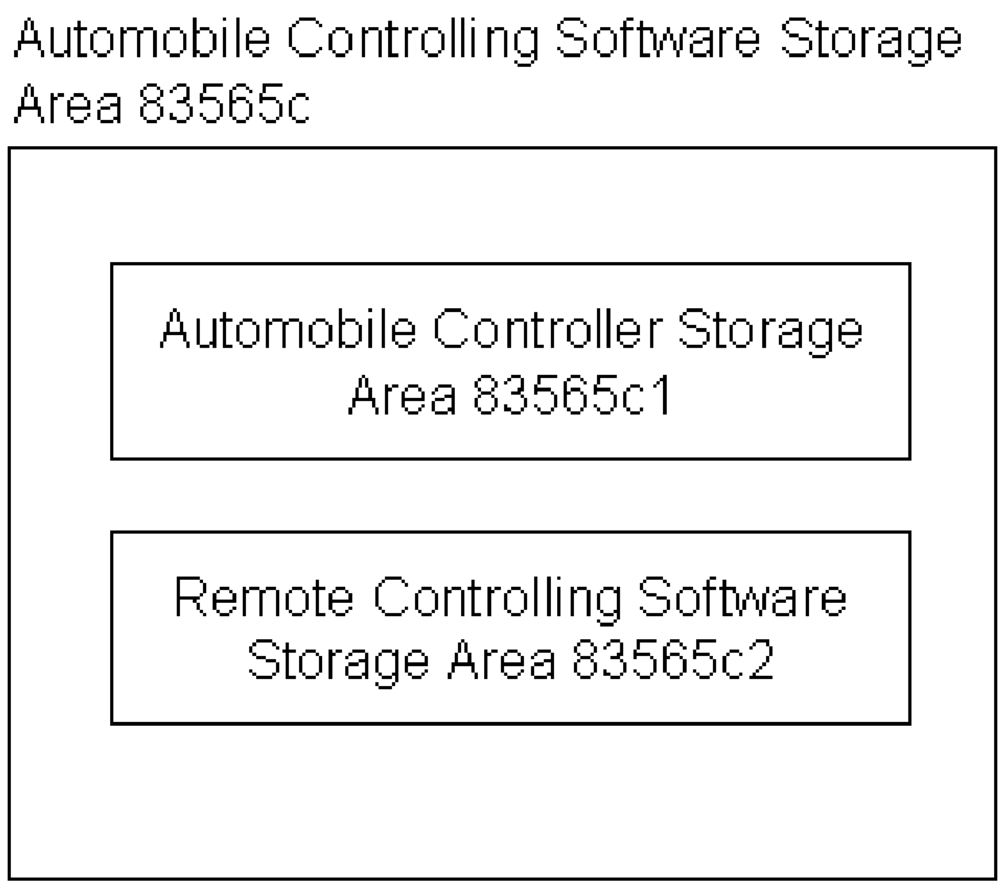

Fig. 1598

Automobile Controller Storage Area
83565c1

Engine Controller 83565c1a
Direction Controller 83565c1b
Speed Controller 83565c1c
Window Controller 83565c1d
Door Controller 83565c1e
Radio Controller 83565c1f
TV Controller 83565c1g
Radio Channel Selector 83565c1h
TV Channel Selector 83565c1i
Blinker Controller 83565c1j
Emergency Lamp Controller 83565c1k
Cruise Control Controller 83565c1l
Speaker Volume Controller 83565c1m

Fig. 1599

Remote Controlling Software Storage Area 83565c2

Engine Controlling Software 83565c2a
Direction Controlling Software 83565c2b
Speed Controlling Software 83565c2c
Window Controlling Software 83565c2d
Door Controlling Software 83565c2e
Radio Controlling Software 83565c2f
TV Controlling Software 83565c2g
Radio Channel Selecting Software 83565c2h
TV Channel Selecting Software 83565c2i
Blinker Controlling Software 83565c2j
Emergency Lamp Controlling Software 83565c2k
Cruise Control Controlling Software 83565c2l
Speaker Volume Controlling Software 83565c2m
Controller Reinstalling Software 83565c2n
Data Reinstalling Software 83565c2o
User Access Authenticating Software 83565c2p Fig. 1600
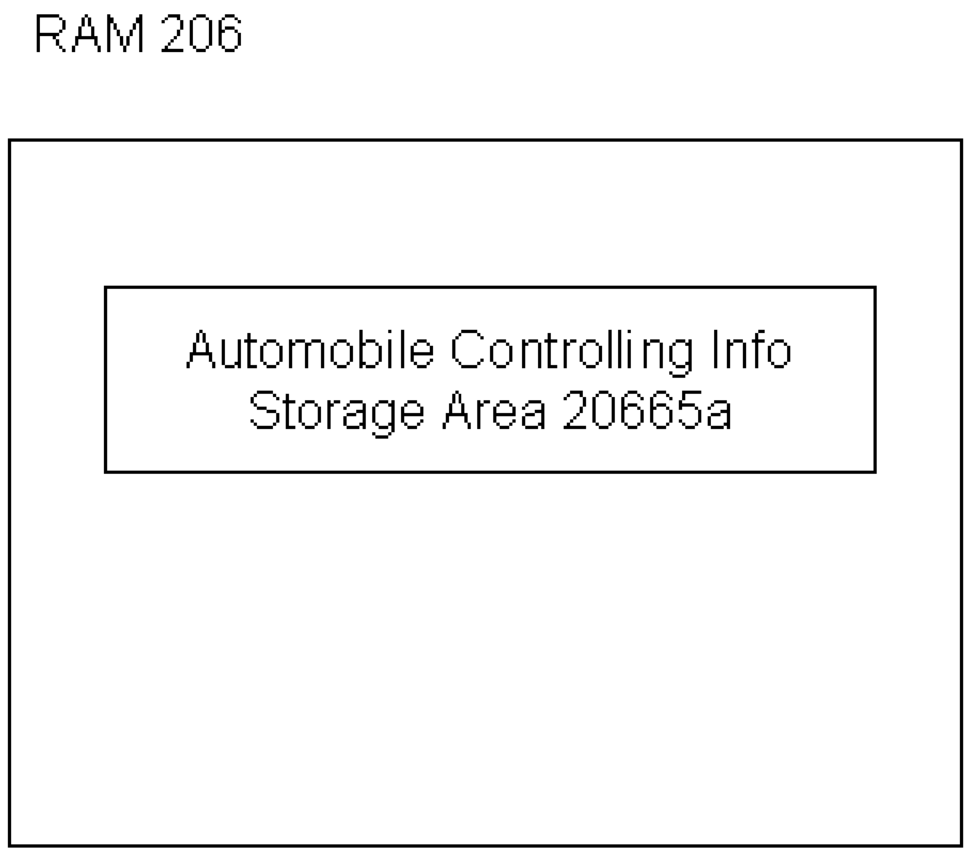

Fig. 1601
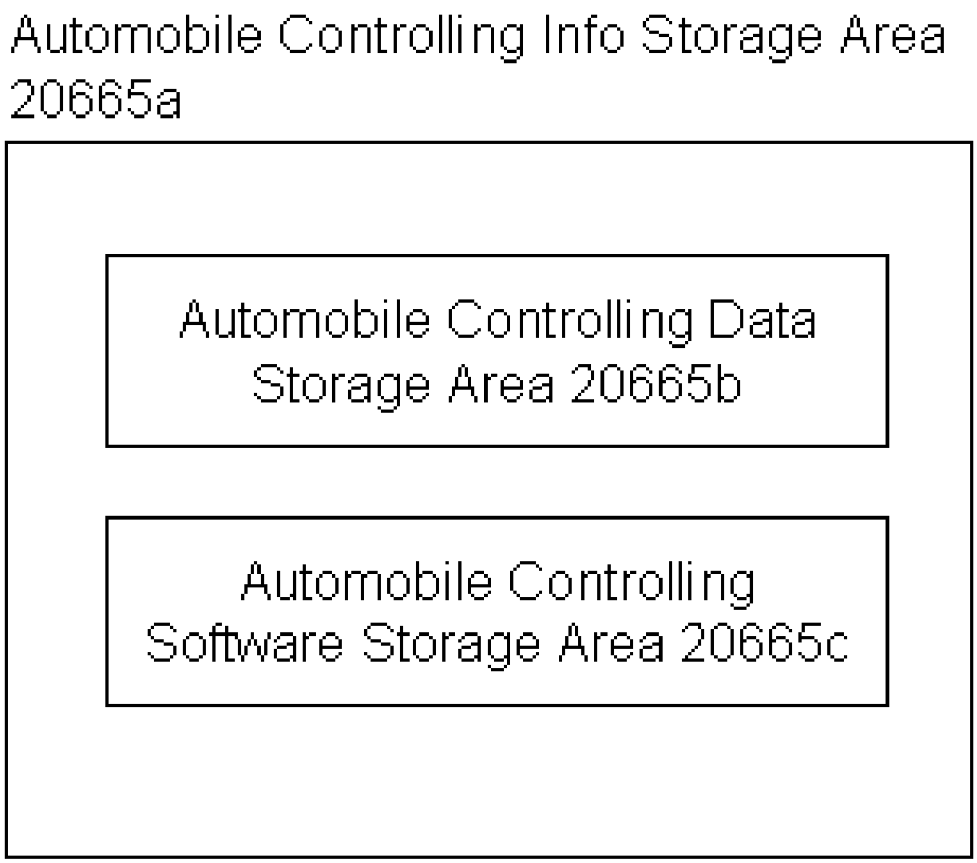

Fig. 1602
Automobile Controlling Data Storage Area 20665b
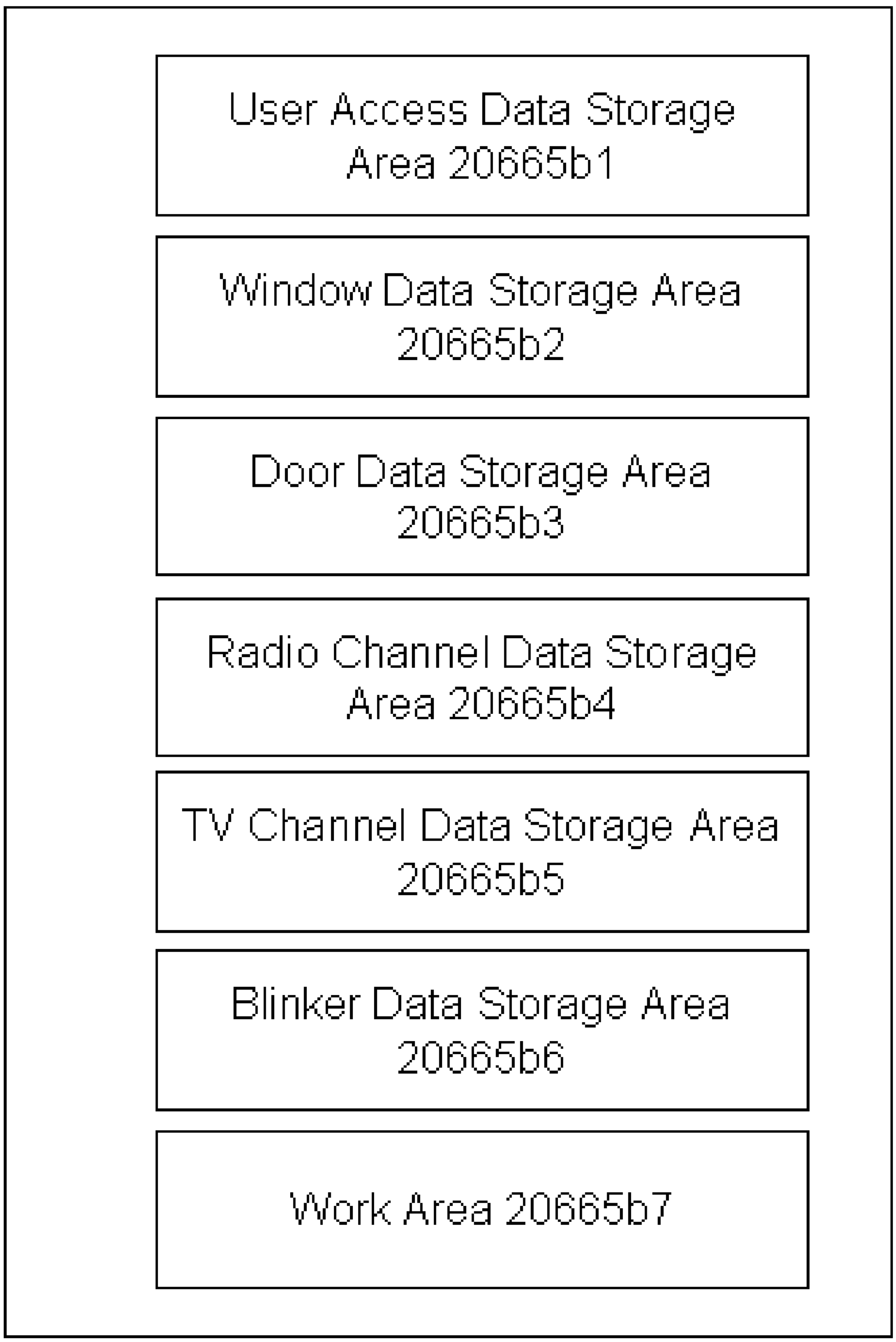

Fig. 1603

User Access Data Storage Area
20665b1

| User ID | Password Data |
| --- | --- |
| User#1 | Password Data#1 |

Fig. 1604

Window Data Storage Area 20665b2

| Window ID | Window Data |
|---|---|
| Window#1 | Window Data#1 |
| Window#2 | Window Data#2 |
| Window#3 | Window Data#3 |
| Window#4 | Window Data#4 |

Fig. 1605

Door Data Storage Area 20665b3

| Door ID | Door Data |
| --- | --- |
| Door#1 | Door Data#1 |
| Door#2 | Door Data#2 |
| Door#3 | Door Data#3 |
| Door#4 | Door Data#4 |

Fig. 1606

Radio Channel Data Storage Area
20665b4

| Radio Channel ID | Radio Channel Data |
|---|---|
| Radio Channel#1 | Radio Channel Data#1 |
| Radio Channel#2 | Radio Channel Data#2 |
| Radio Channel#3 | Radio Channel Data#3 |
| Radio Channel#4 | Radio Channel Data#4 |

Fig. 1607

TV Channel Data Storage Area
20665b5

| TV Channel ID | TV Channel Data |
|---|---|
| TV Channel#1 | TV Channel Data#1 |
| TV Channel#2 | TV Channel Data#2 |
| TV Channel#3 | TV Channel Data#3 |
| TV Channel#4 | TV Channel Data#4 |

Fig. 1608

Blinker Data Storage Area 20665b6

| Blinker ID | Blinker Data |
| --- | --- |
| Blinker#1 | Blinker Data#1 |
| Blinker#2 | Blinker Data#2 |

Fig. 1609
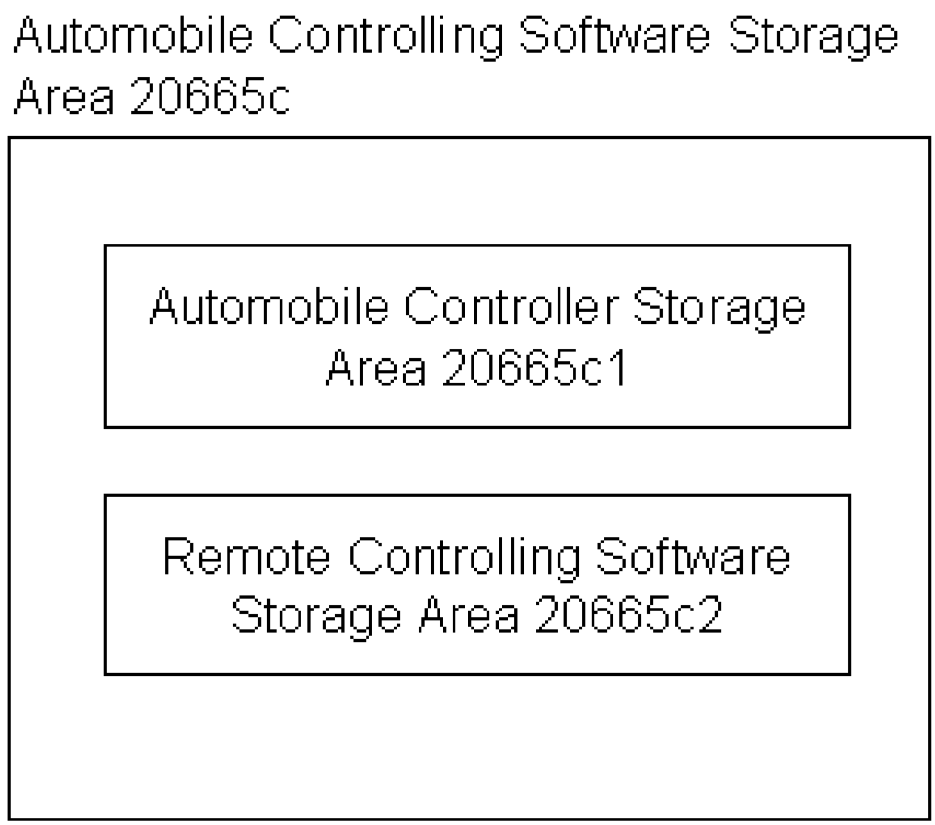

Fig. 1610

Automobile Controller Storage Area
20665c1

| |
|---|
| Engine Controller 20665c1a |
| Direction Controller 20665c1b |
| Speed Controller 20665c1c |
| Window Controller 20665c1d |
| Door Controller 20665c1e |
| Radio Controller 20665c1f |
| TV Controller 20665c1g |
| Radio Channel Selector 20665c1h |
| TV Channel Selector 20665c1i |
| Blinker Controller 20665c1j |
| Emergency Lamp Controller 20665c1k |
| Cruise Control Controller 20665c1l |
| Speaker Volume Controller 20665c1m |

Fig. 1611

Remote Controlling Software Storage Area 20665c2

| |
|---|
| Engine Controlling Software 20665c2a |
| Direction Controlling Software 20665c2b |
| Speed Controlling Software 20665c2c |
| Window Controlling Software 20665c2d |
| Door Controlling Software 20665c2e |
| Radio Controlling Software 20665c2f |
| TV Controlling Software 20665c2g |
| Radio Channel Selecting Software 20665c2h |
| TV Channel Selecting Software 20665c2i |
| Blinker Controlling Software 20665c2j |
| Emergency Lamp Controlling Software 20665c2k |
| Cruise Control Controlling Software 20665c2l |
| Speaker Volume Controlling Software 20665c2m |
| Controller Reinstalling Software 20665c2n |
| Data Reinstalling Software 20665c2o |
| User Access Authenticating Software 20665c2p |

Fig. 1612
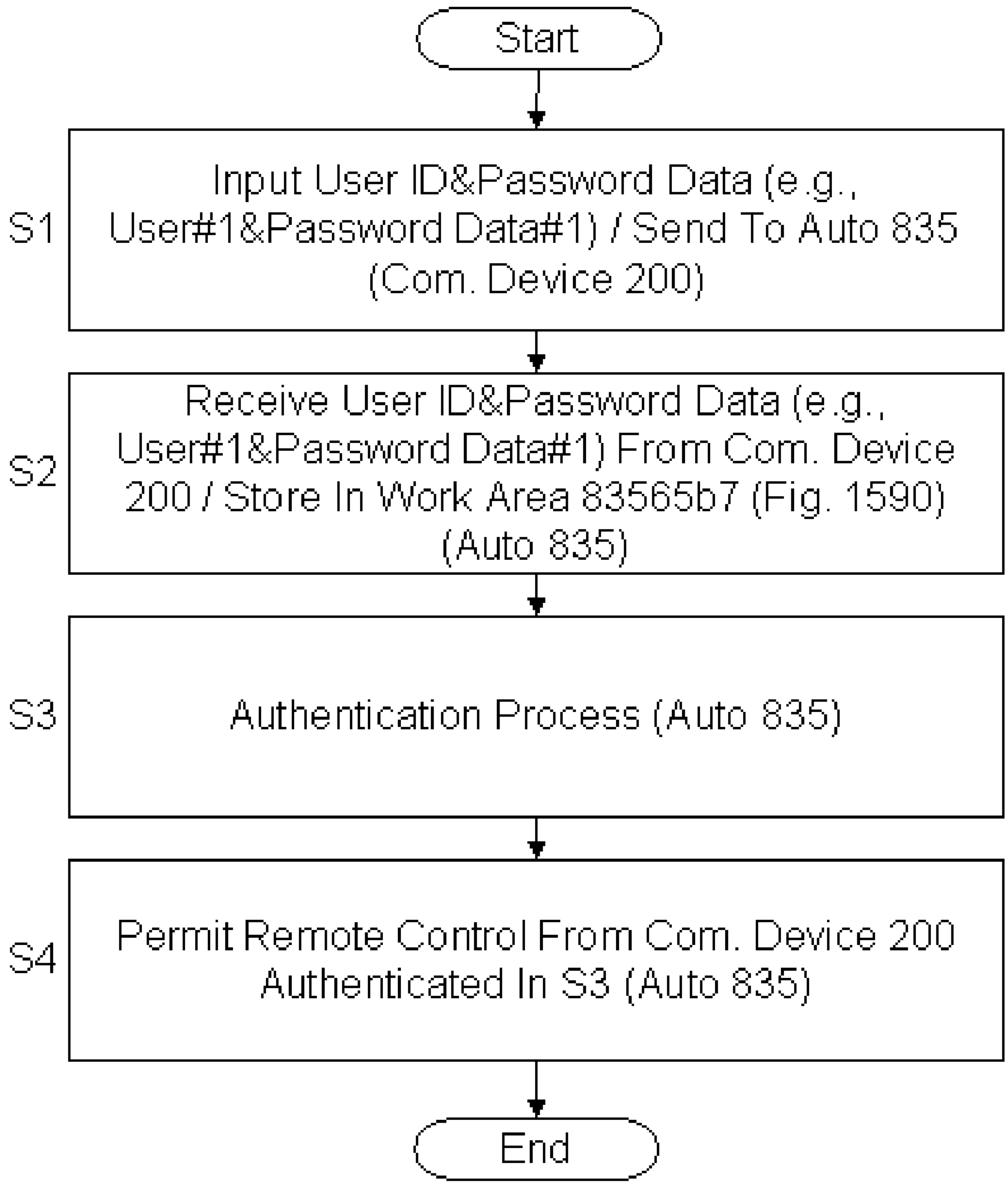

Fig. 1613
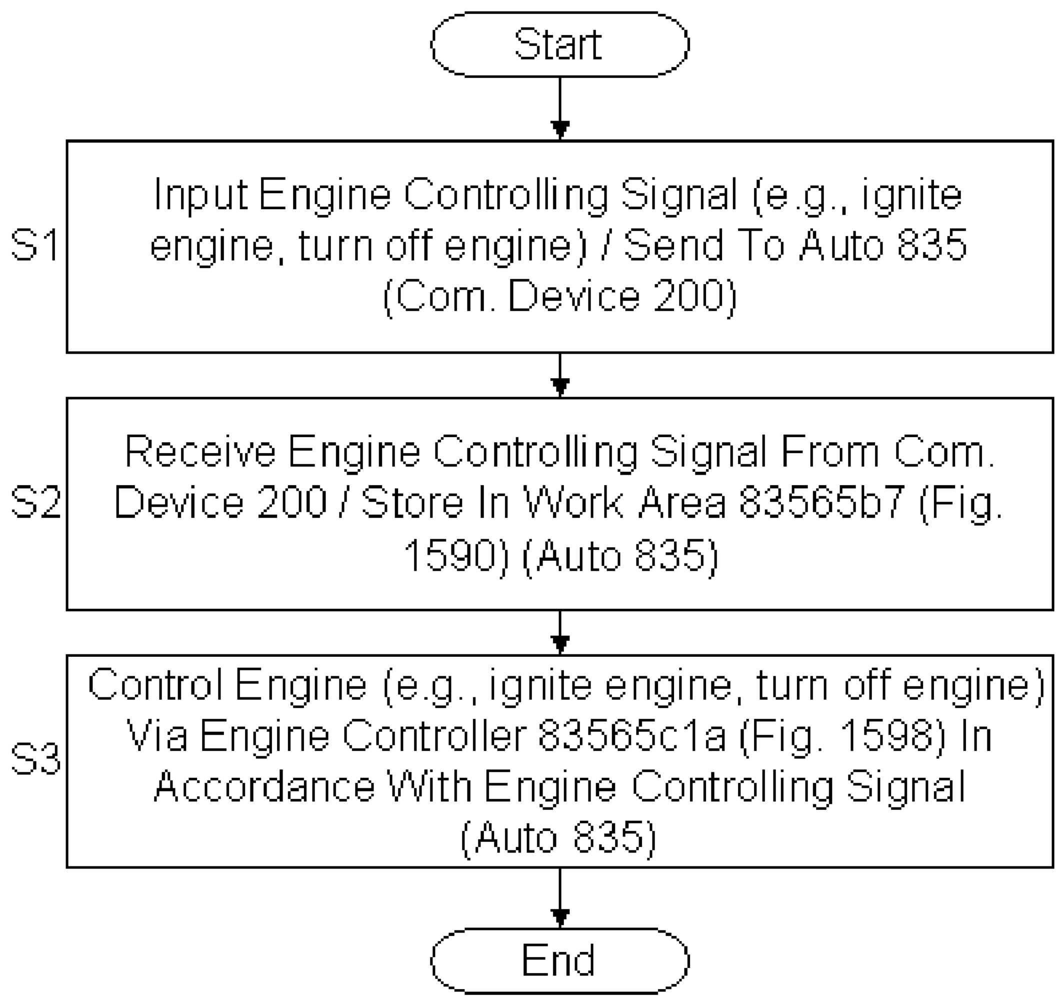

Fig. 1614
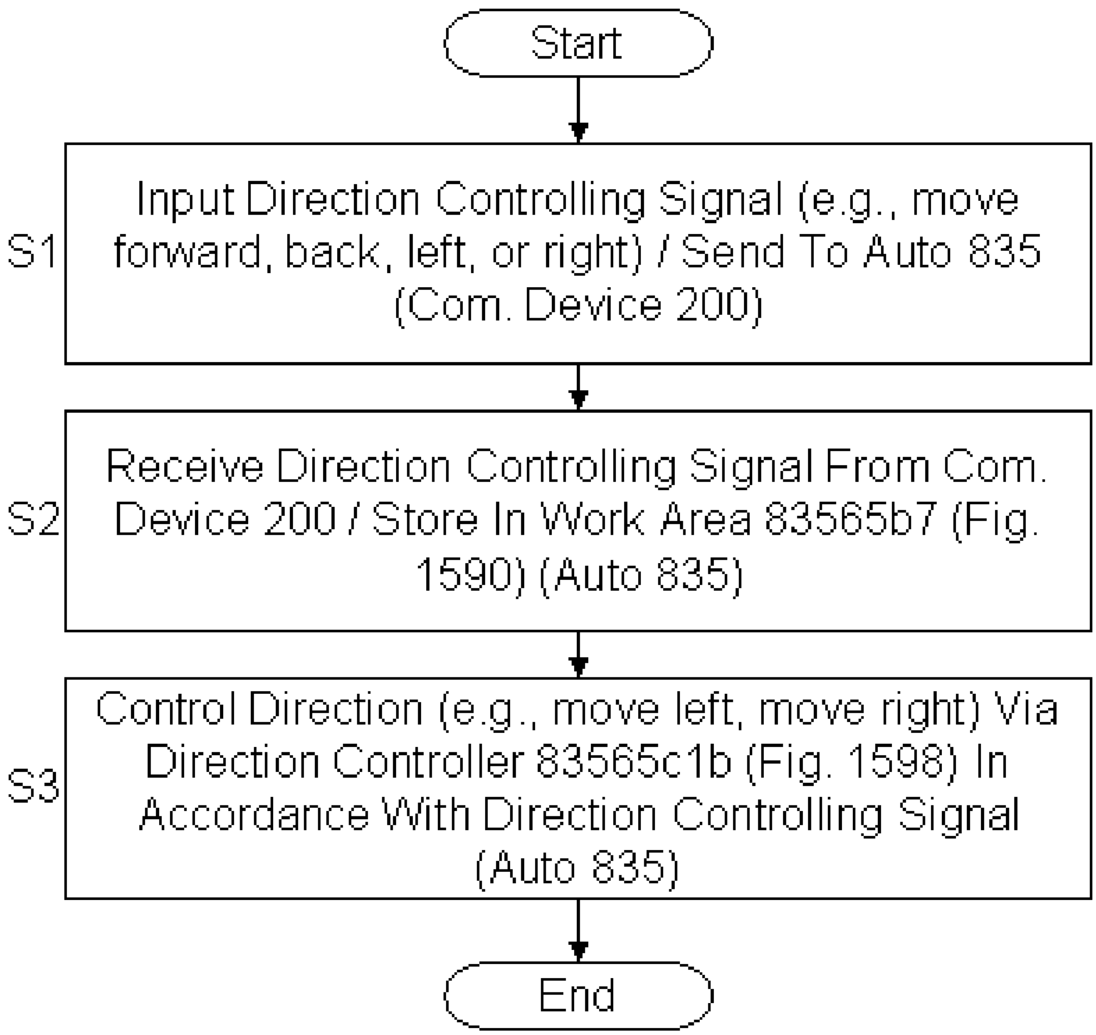

Fig. 1615
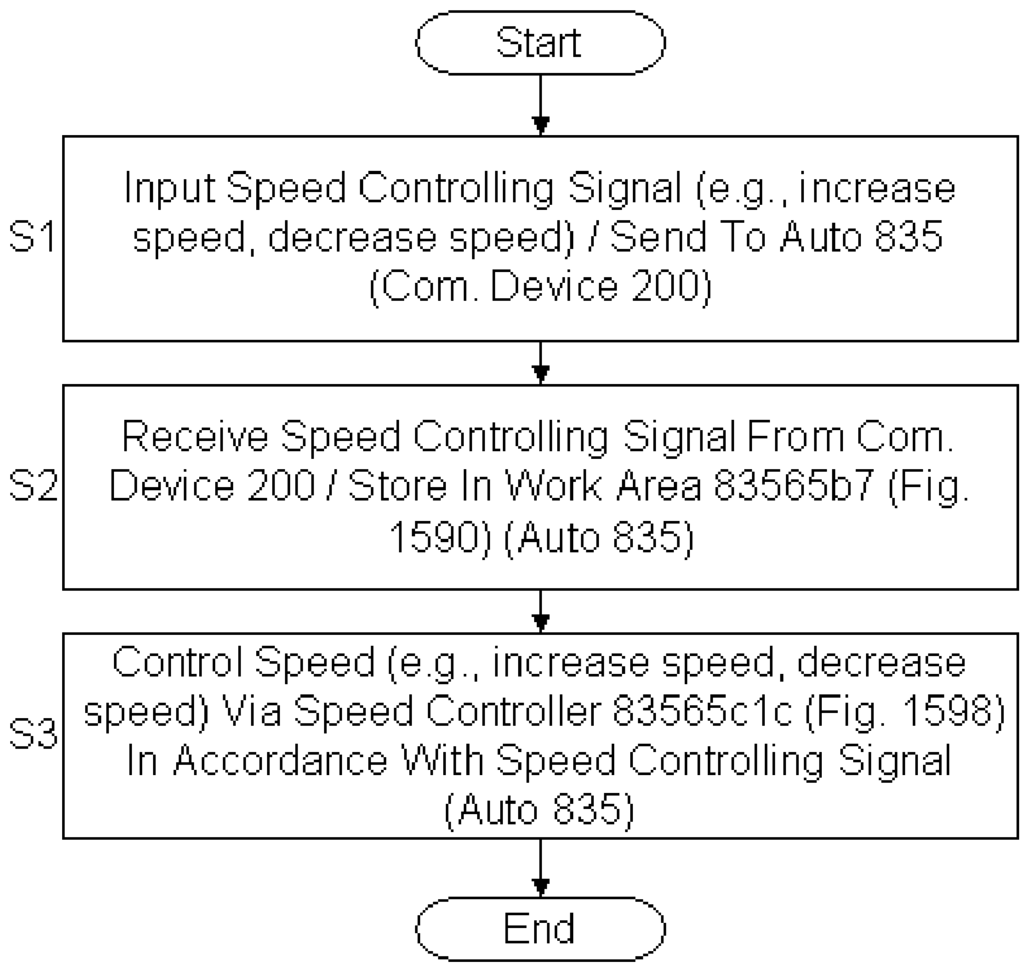

Fig. 1616
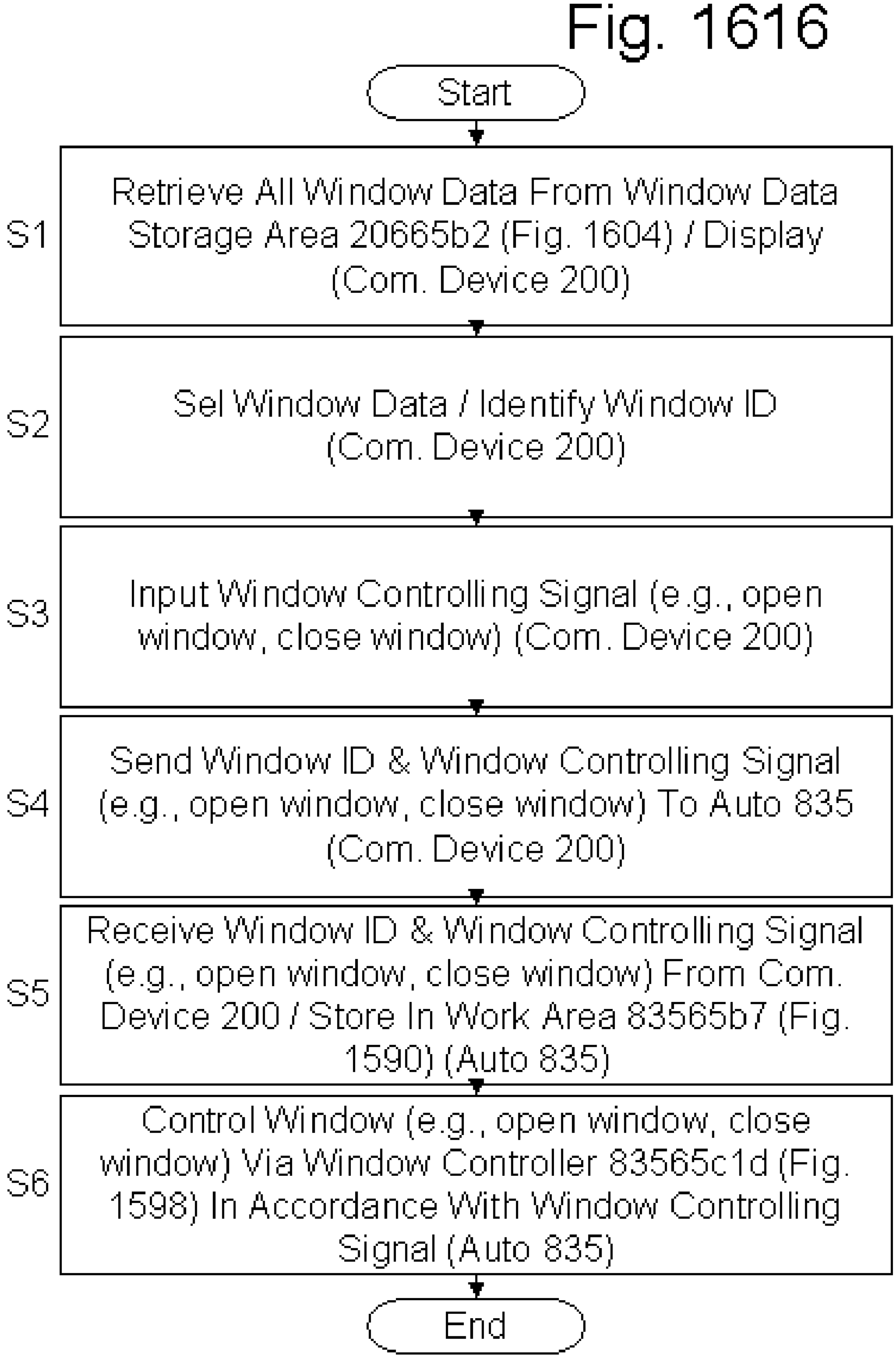

Fig. 1617
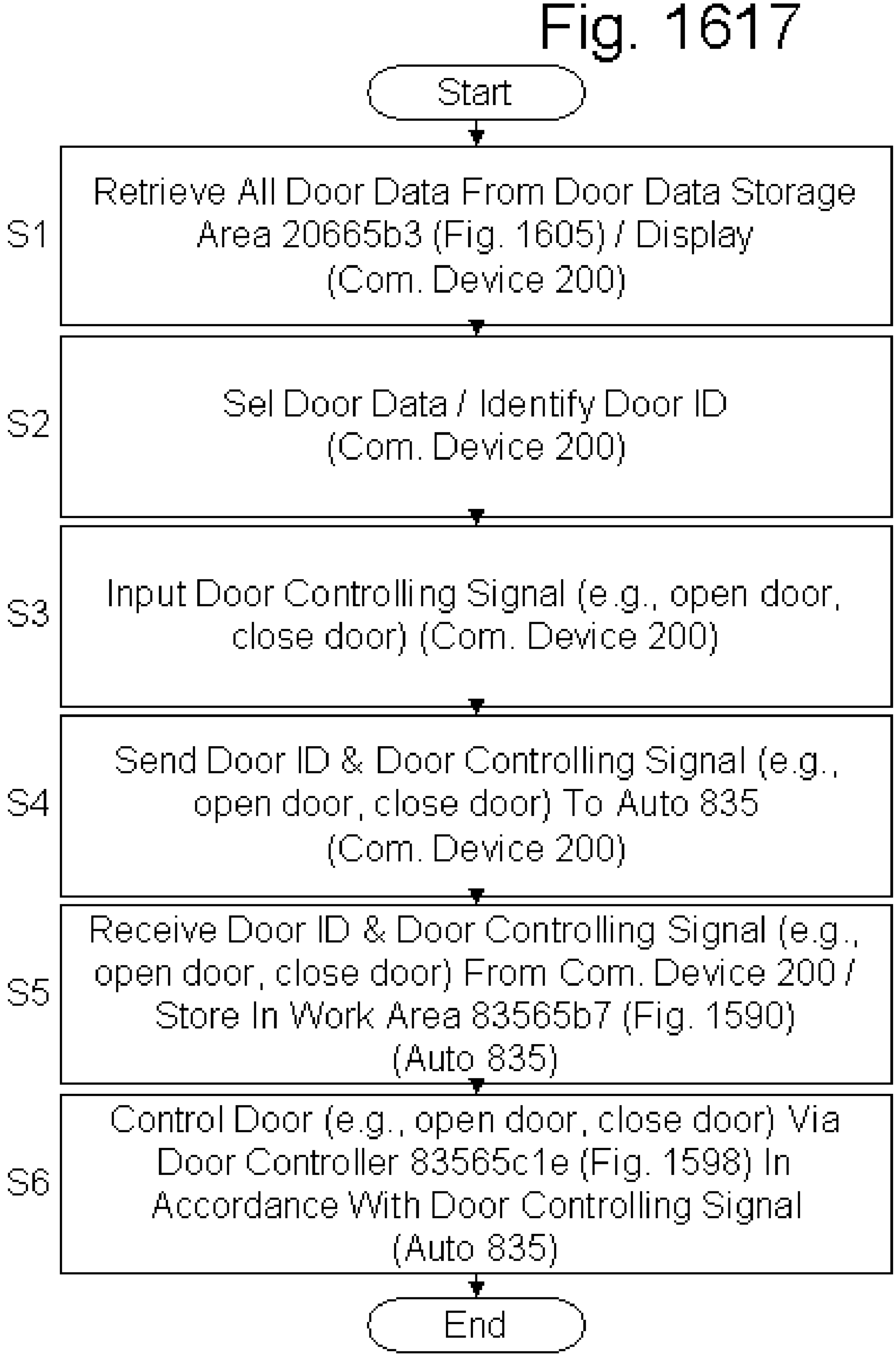

Fig. 1618
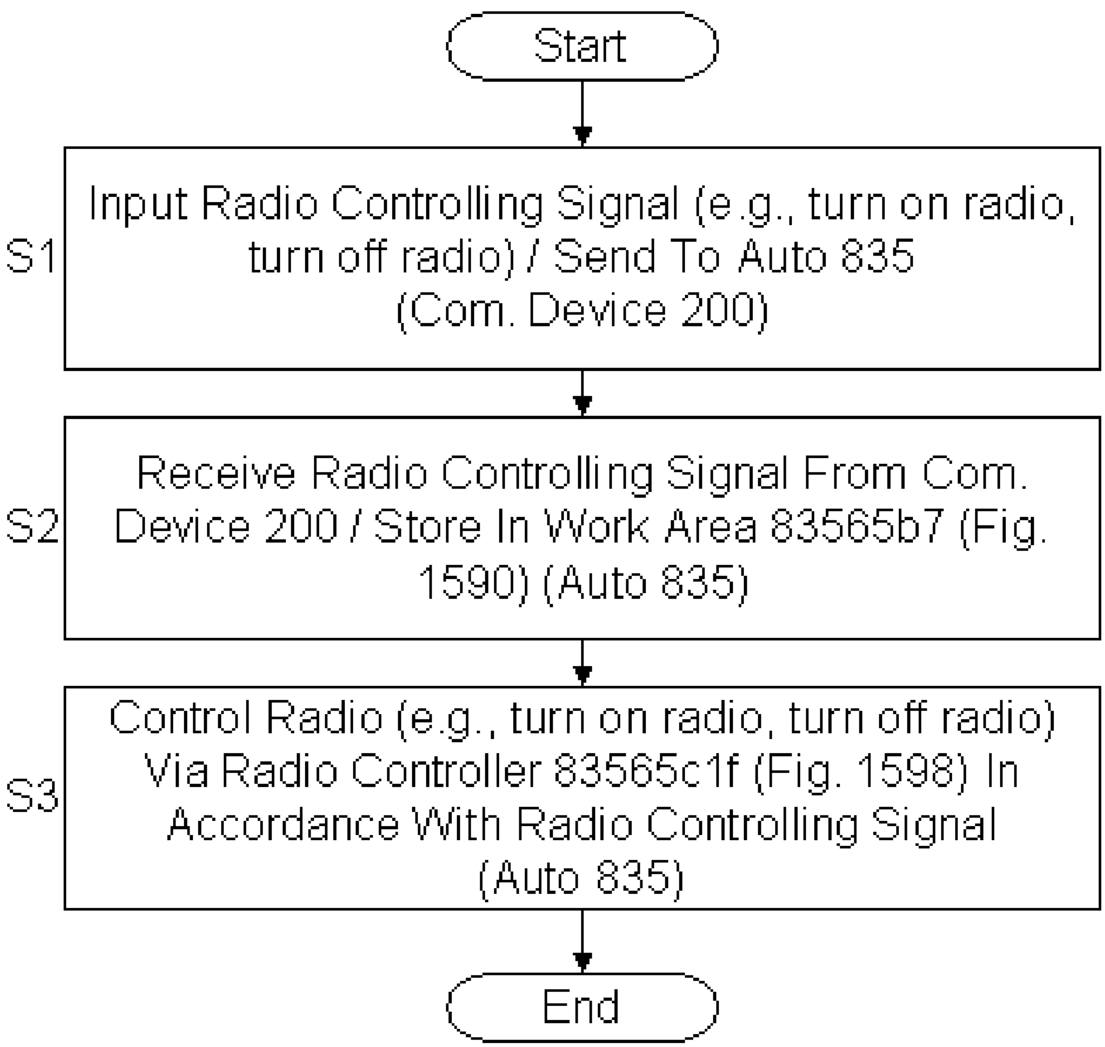

Fig. 1619
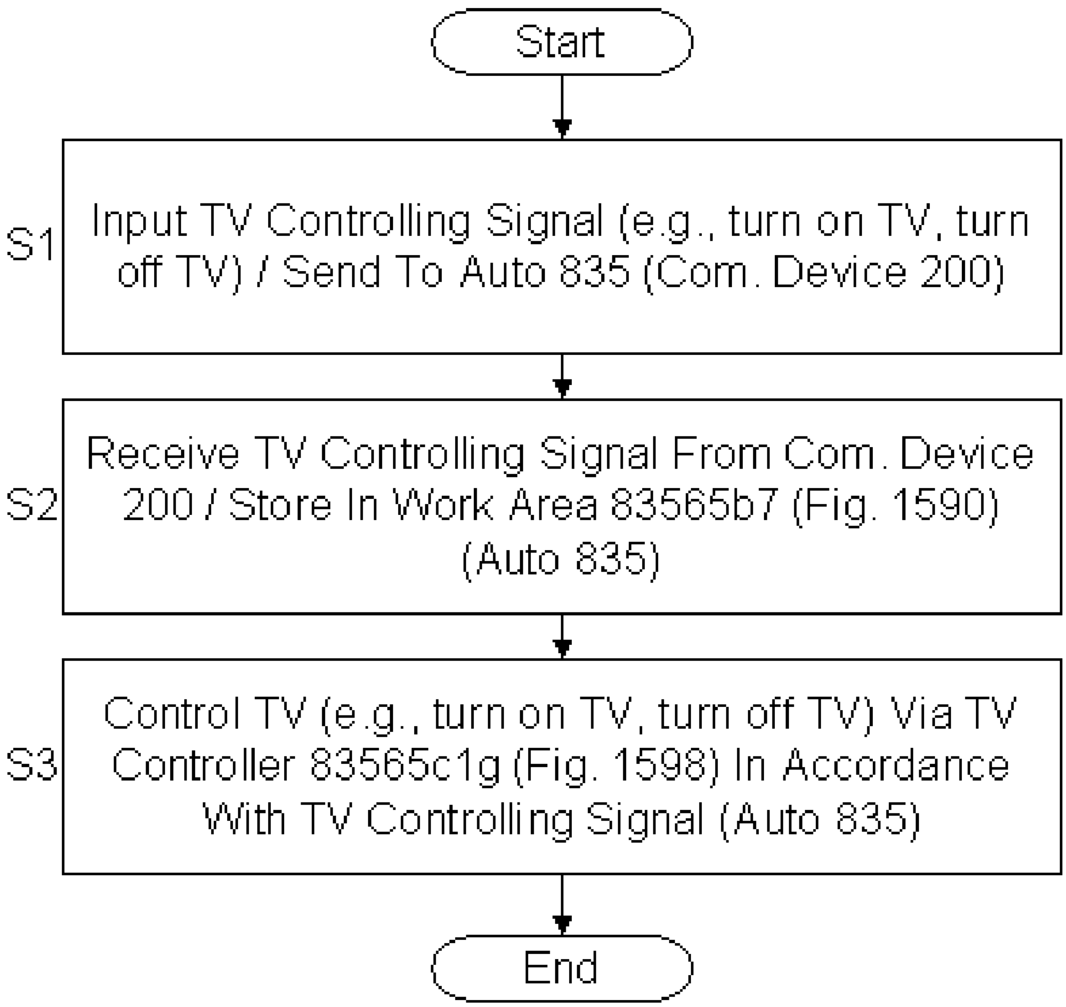

Fig. 1620
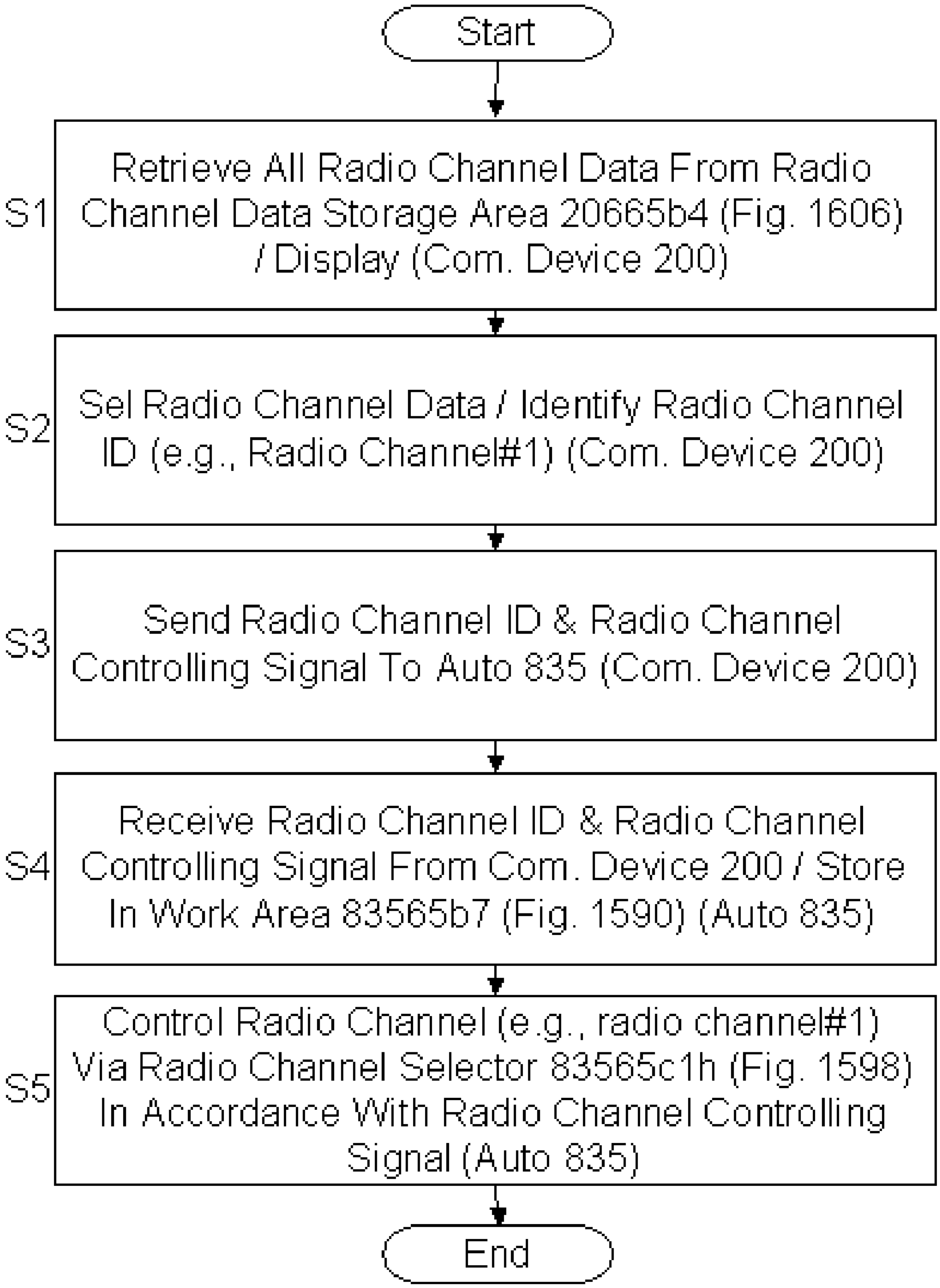

Fig. 1621
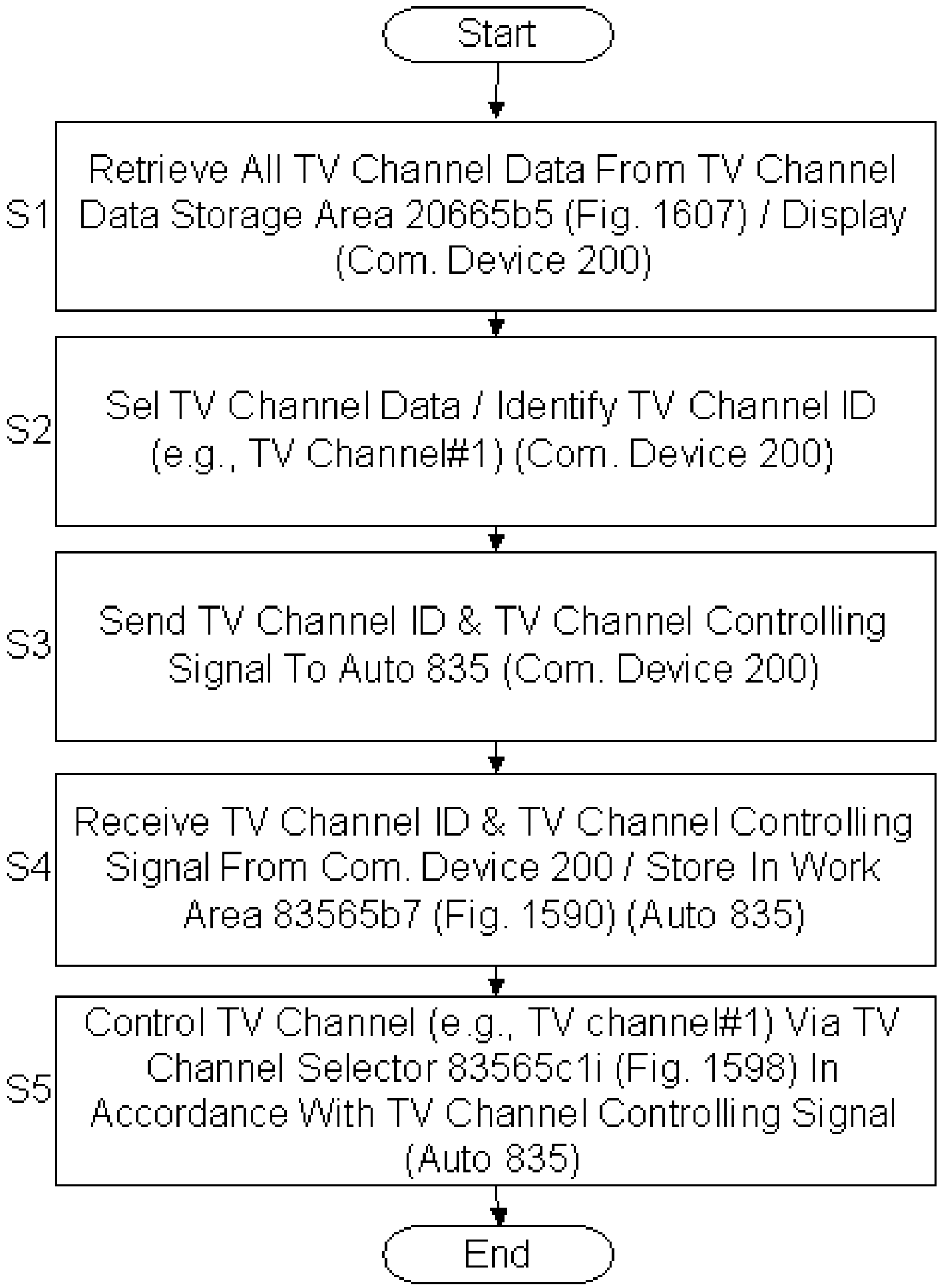

Fig. 1622
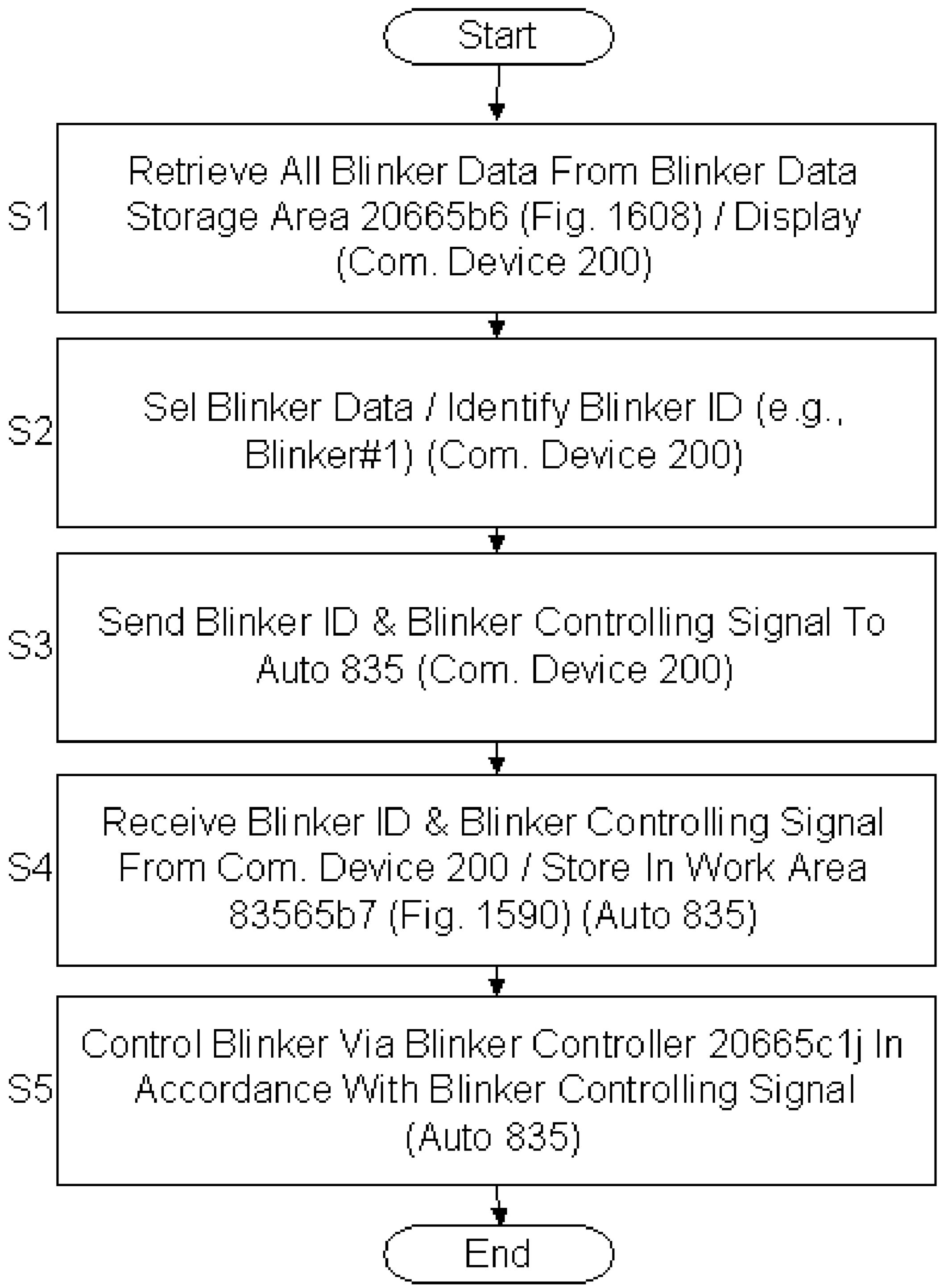

Fig. 1623
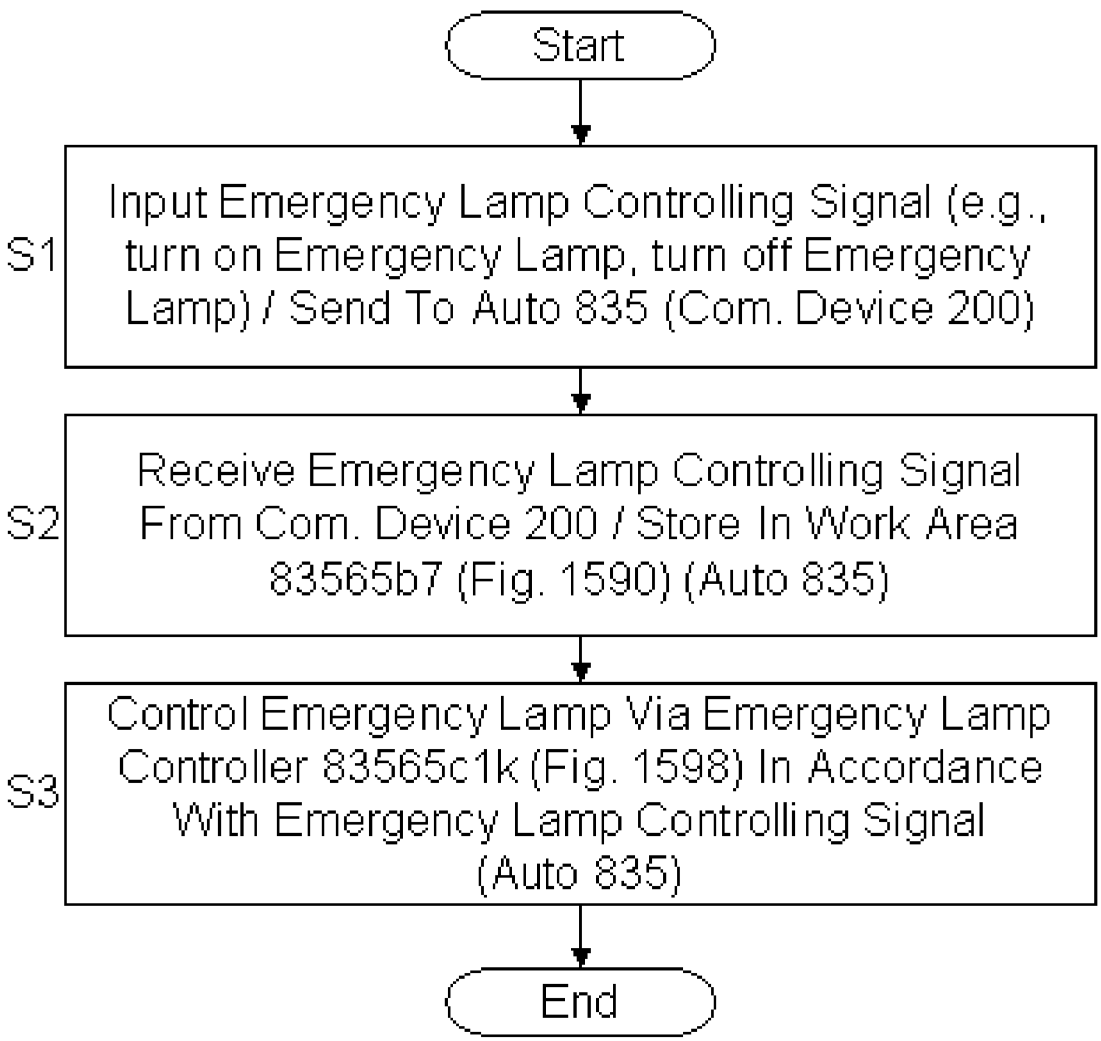

Fig. 1624
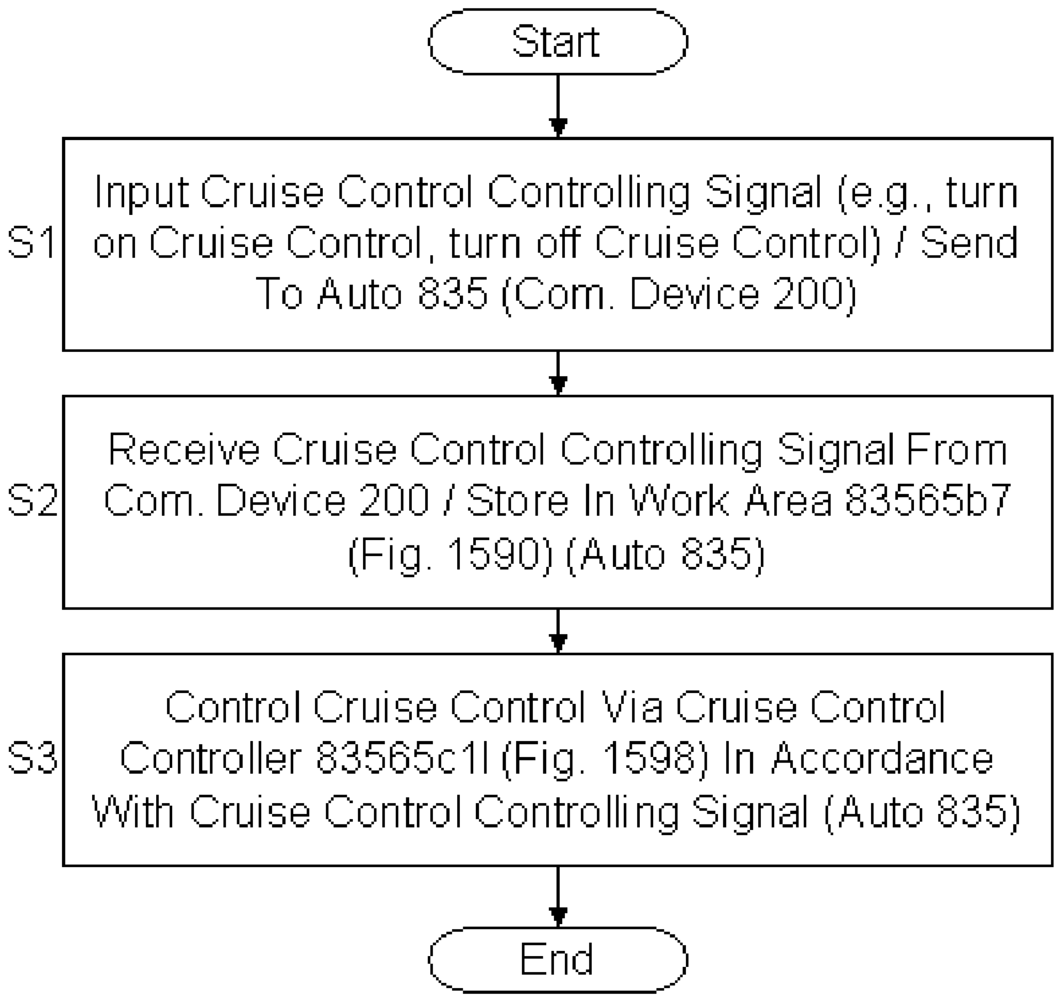

Fig. 1625
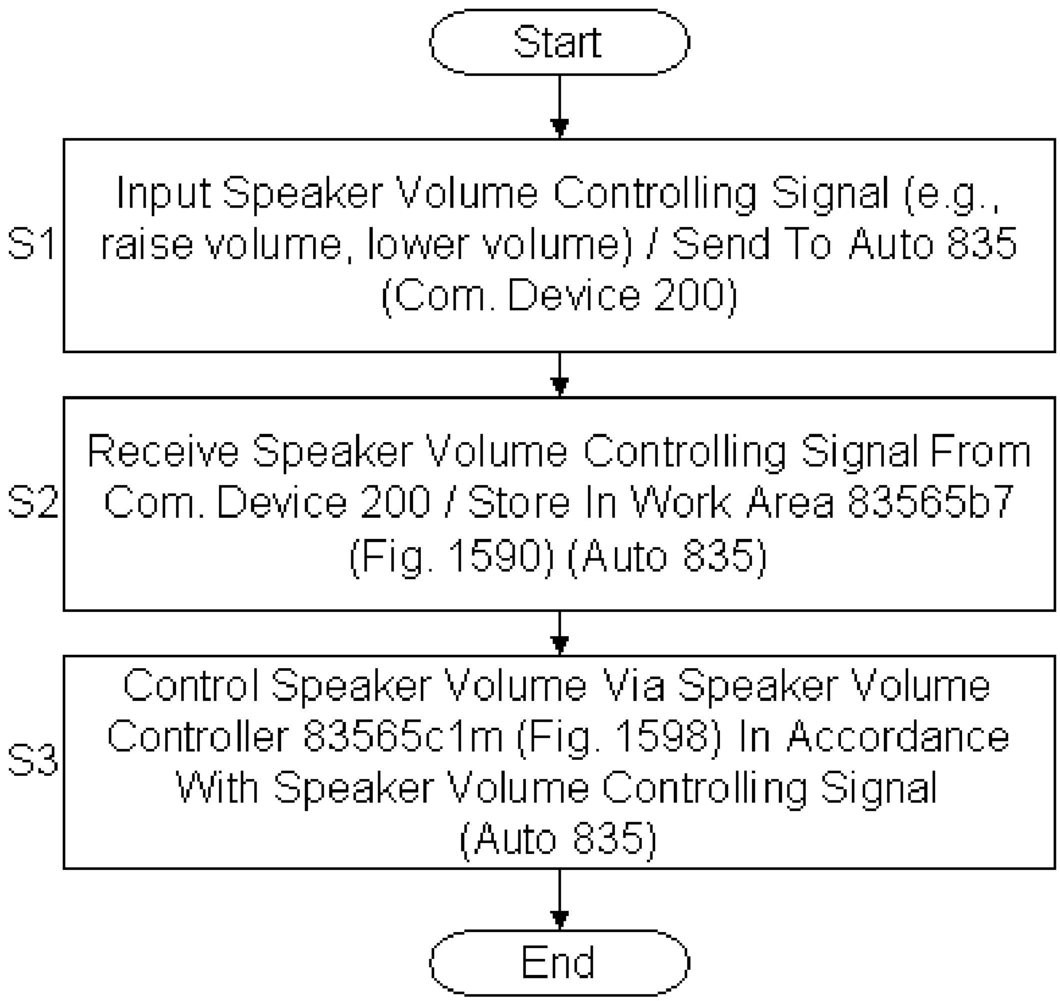

Fig. 1626
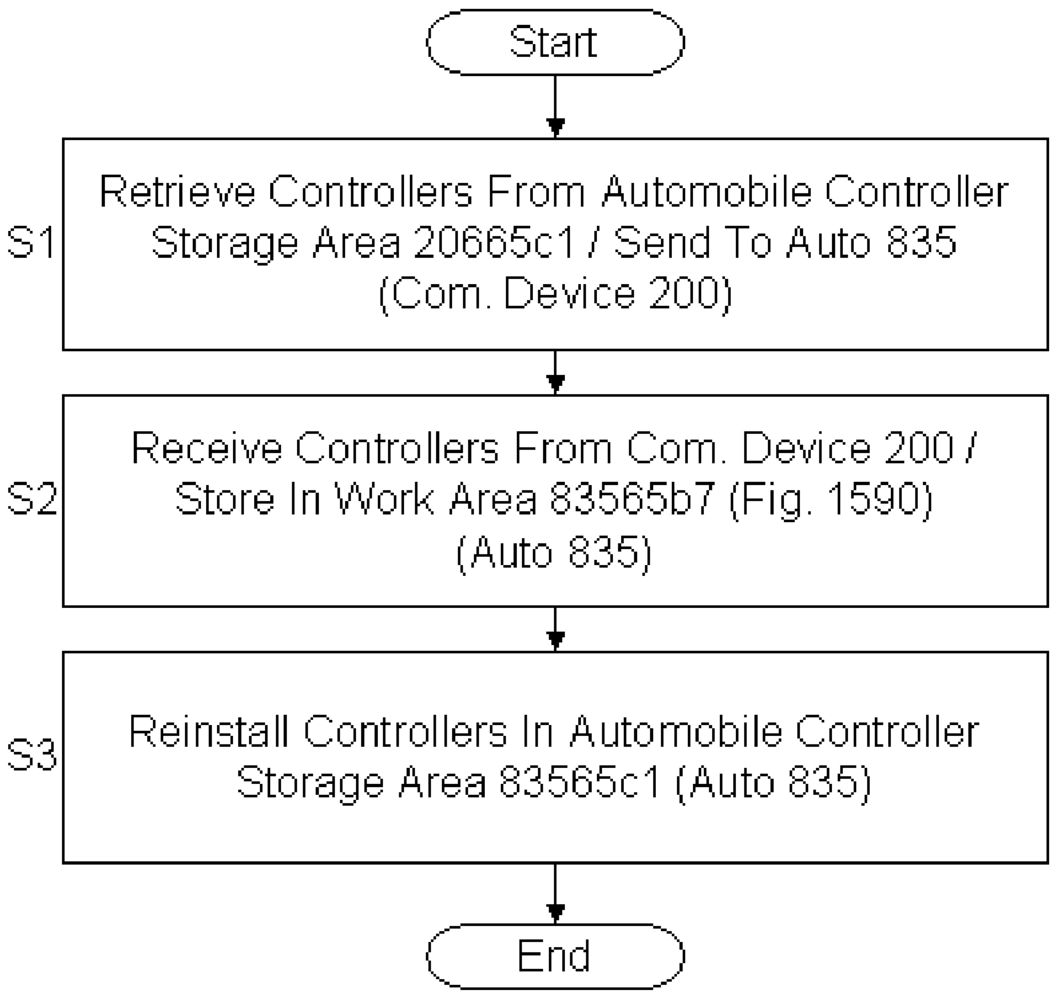

Fig. 1627
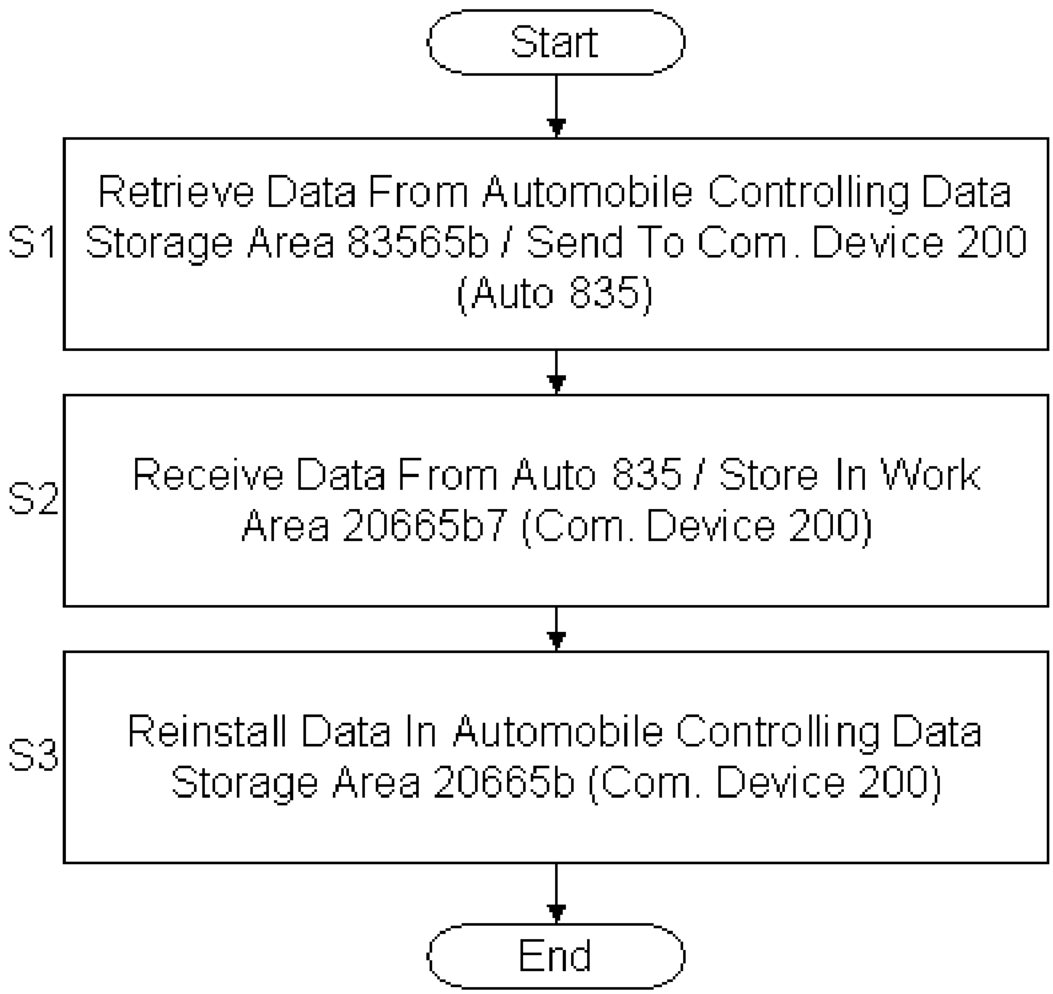

Fig. 1628
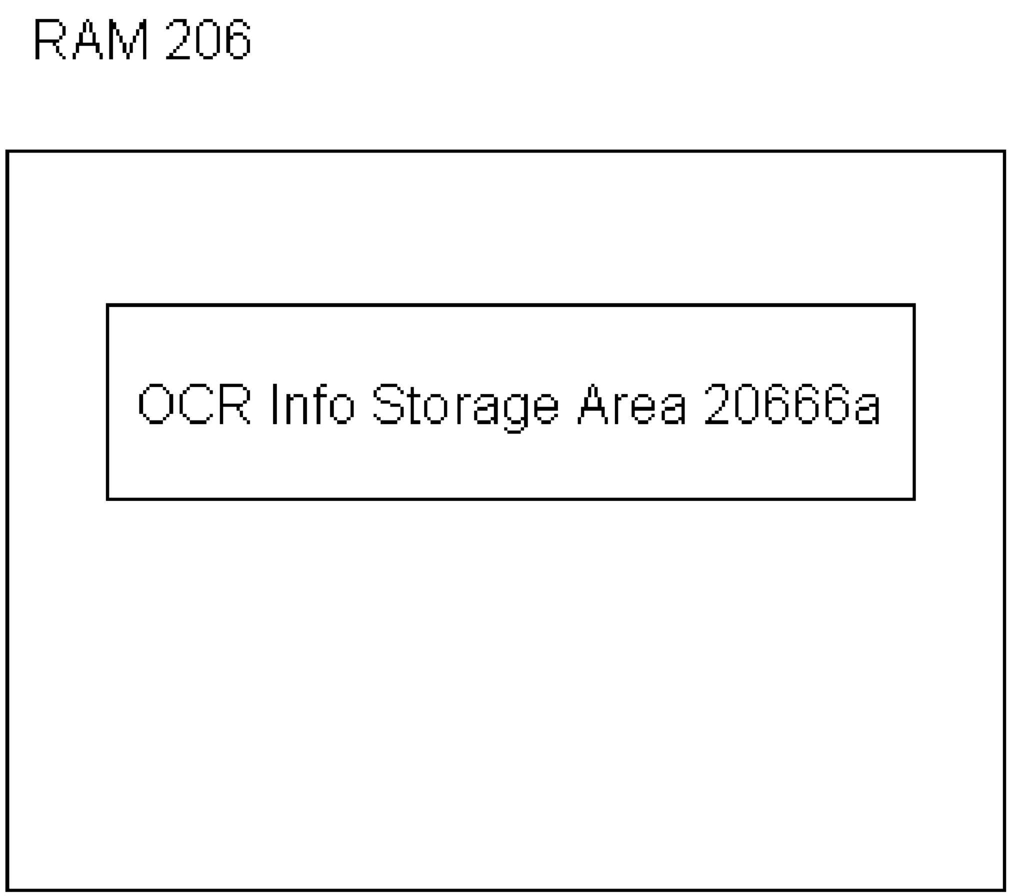

Fig. 1629
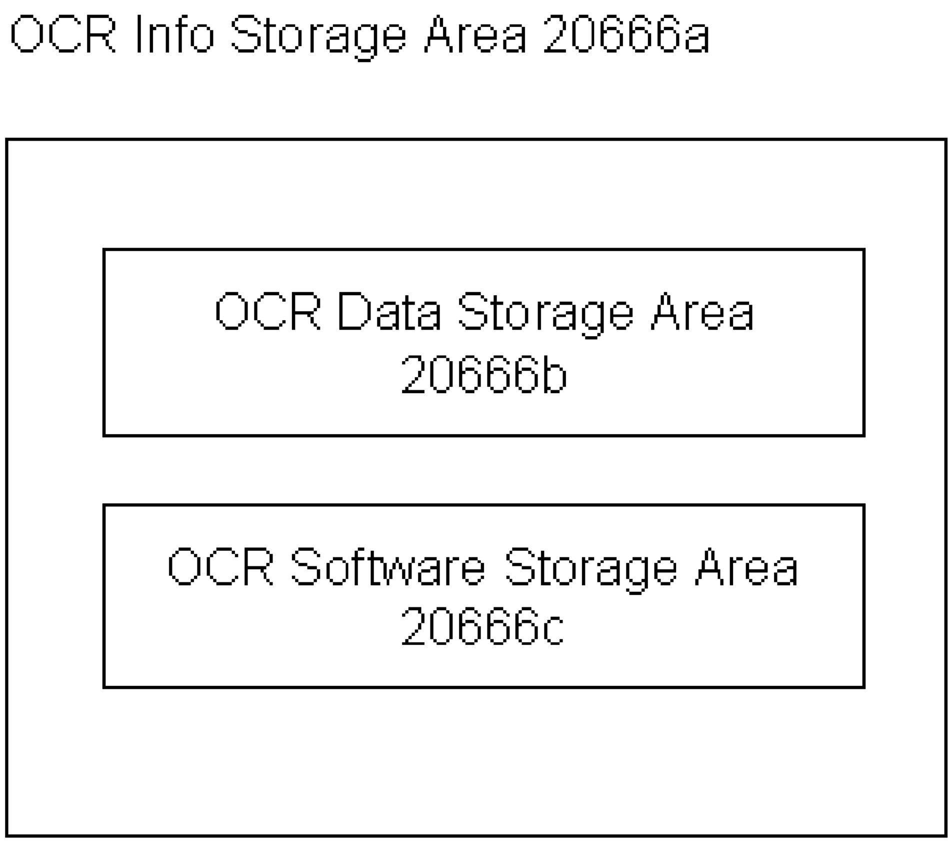

Fig. 1630
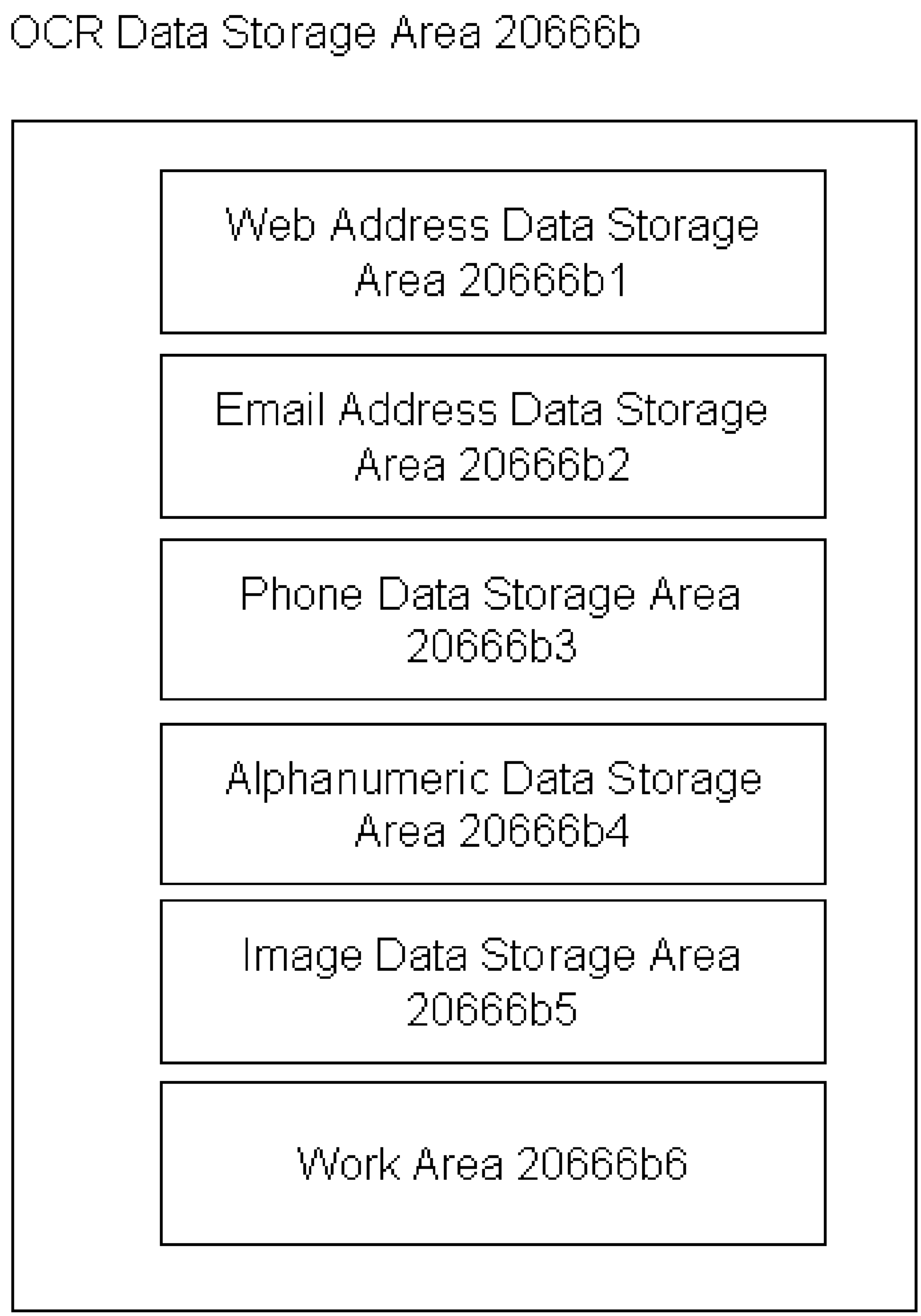

Fig. 1631

Web Address Data Storage Area
20666b1

| Web Address ID | Web Address Data |
| --- | --- |
| Web Address#1 | Web Address Data#1 |
| Web Address#2 | Web Address Data#2 |
| Web Address#3 | Web Address Data#3 |
| Web Address#4 | Web Address Data#4 |

Fig. 1632

Email Address Data Storage Area
20666b2

| **Email Address ID** | **Email Address Data** |
|---|---|
| Email Address#1 | Email Address Data#1 |
| Email Address#2 | Email Address Data#2 |
| Email Address#3 | Email Address Data#3 |
| Email Address#4 | Email Address Data#4 |

Fig. 1633

Phone Data Storage Area 20666b3

| Phone ID | Phone Data |
|---|---|
| Phone#1 | Phone Data#1 |
| Phone#2 | Phone Data#2 |
| Phone#3 | Phone Data#3 |
| Phone#4 | Phone Data#4 |

Fig. 1634

Alphanumeric Data Storage Area
20666b4

| Alphanumeric ID | Alphanumeric Data |
|---|---|
| Alphanumeric#1 | Alphanumeric Data#1 |
| Alphanumeric#2 | Alphanumeric Data#2 |
| Alphanumeric#3 | Alphanumeric Data#3 |
| Alphanumeric#4 | Alphanumeric Data#4 |

Fig. 1635

Image Data Storage Area 20666b5

| Image ID | Image Data |
|---|---|
| Image#1 | Image Data#1 |
| Image#2 | Image Data#2 |
| Image#3 | Image Data#3 |
| Image#4 | Image Data#4 |

Fig. 1636a

OCR Software Storage Area 20666c

Image Data Scanning Software 20666c1
Image Data Storing Software 20666c2
OCR Software 20666c3
Alphanumeric Data Storing Software 20666c4
Web Address Data Identifying Software 20666c5a
Web Address Data Correcting Software 20666c5b
Web Address Data Storing Software 20666c5c
Web Address Accessing Software 20666c5d

Fig. 1636b

OCR Software Storage Area 20666c (cont.)

Email Address Data Identifying Software 20666c6a
Email Address Data Correcting Software 20666c6b
Email Address Data Storing Software 20666c6c
Email Editing Software 20666c6d
Phone Data Identifying Software 20666c7a
Phone Data Correcting Software 20666c7b
Phone Data Storing Software 20666c7c
Dialing Software 20666c7d Fig. 1637
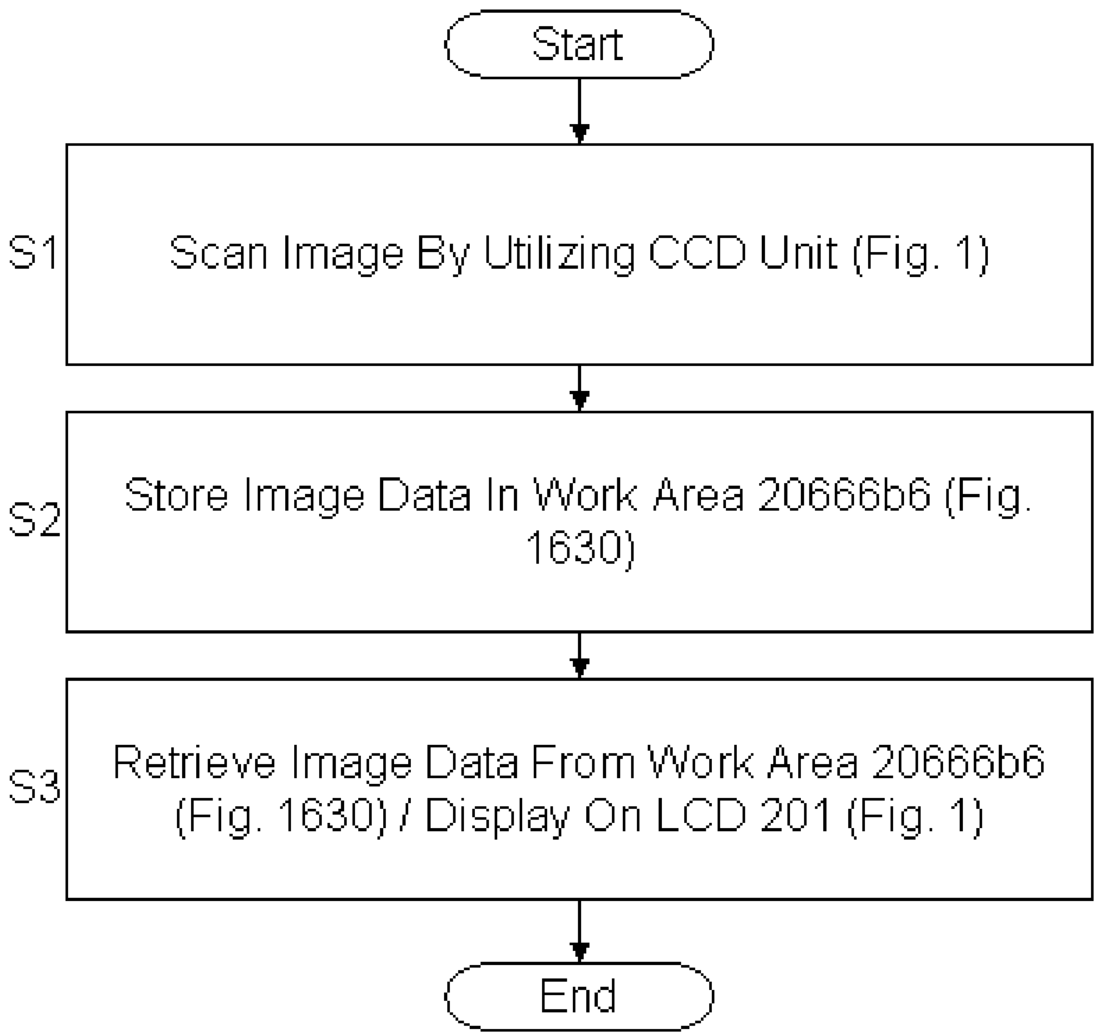

Fig. 1638
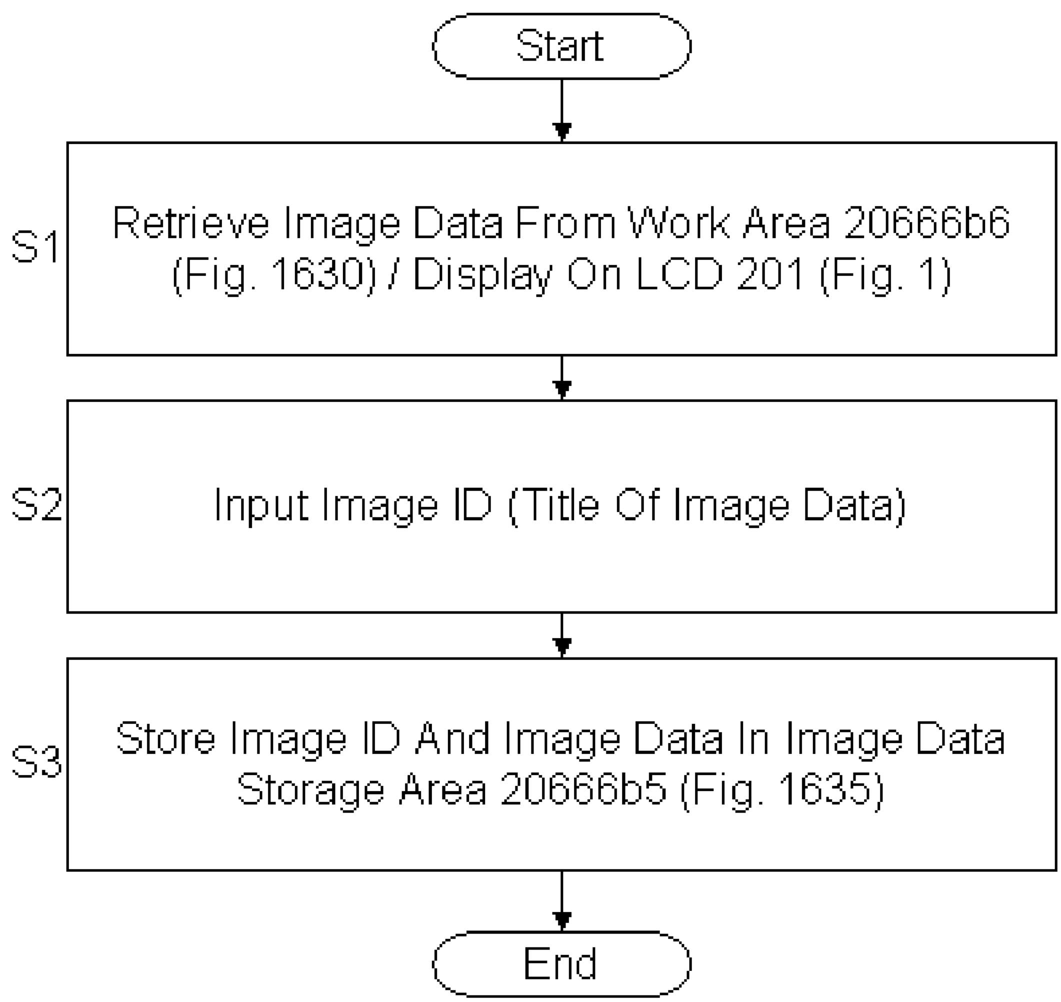

Fig. 1639
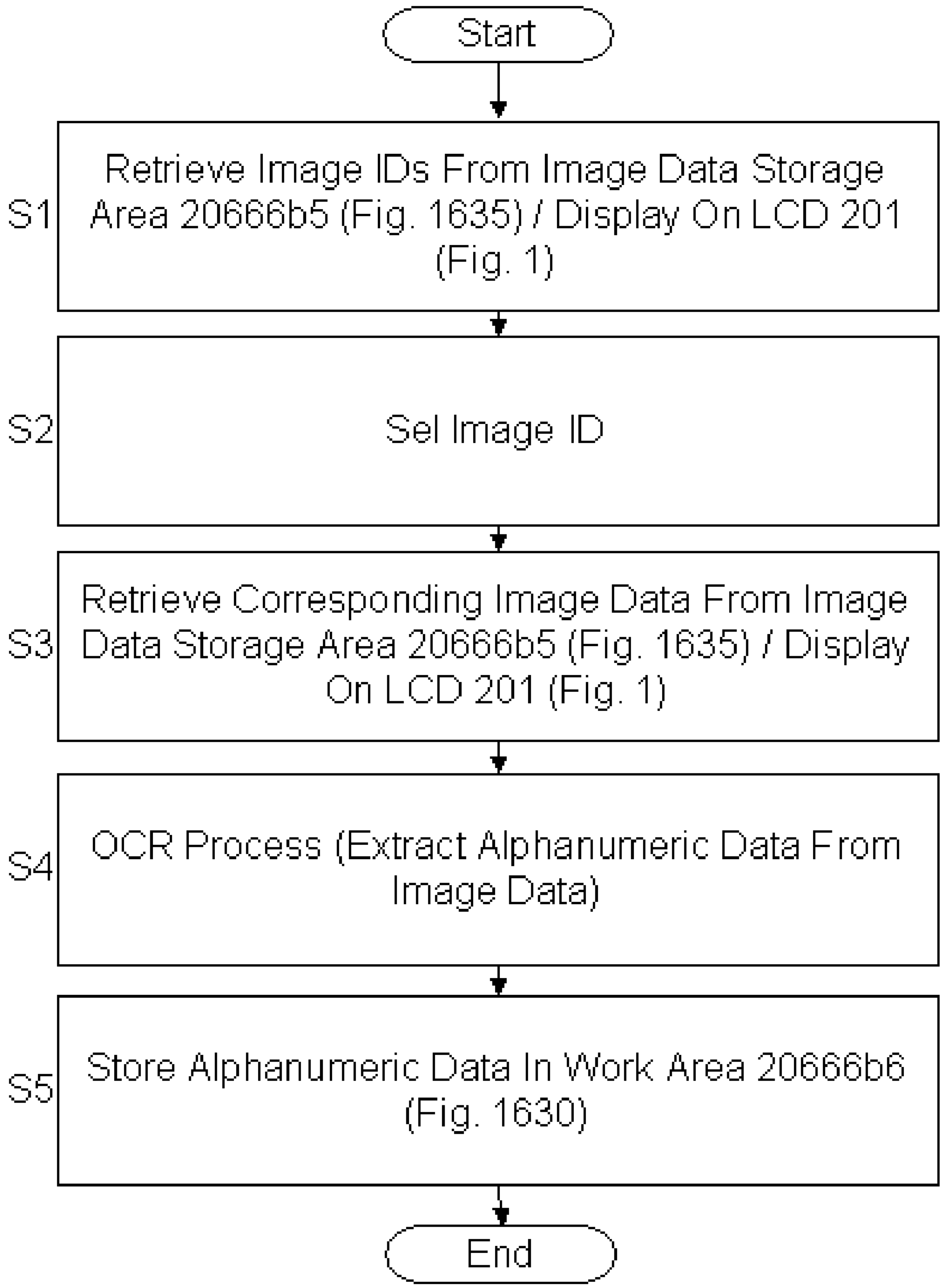

Fig. 1640
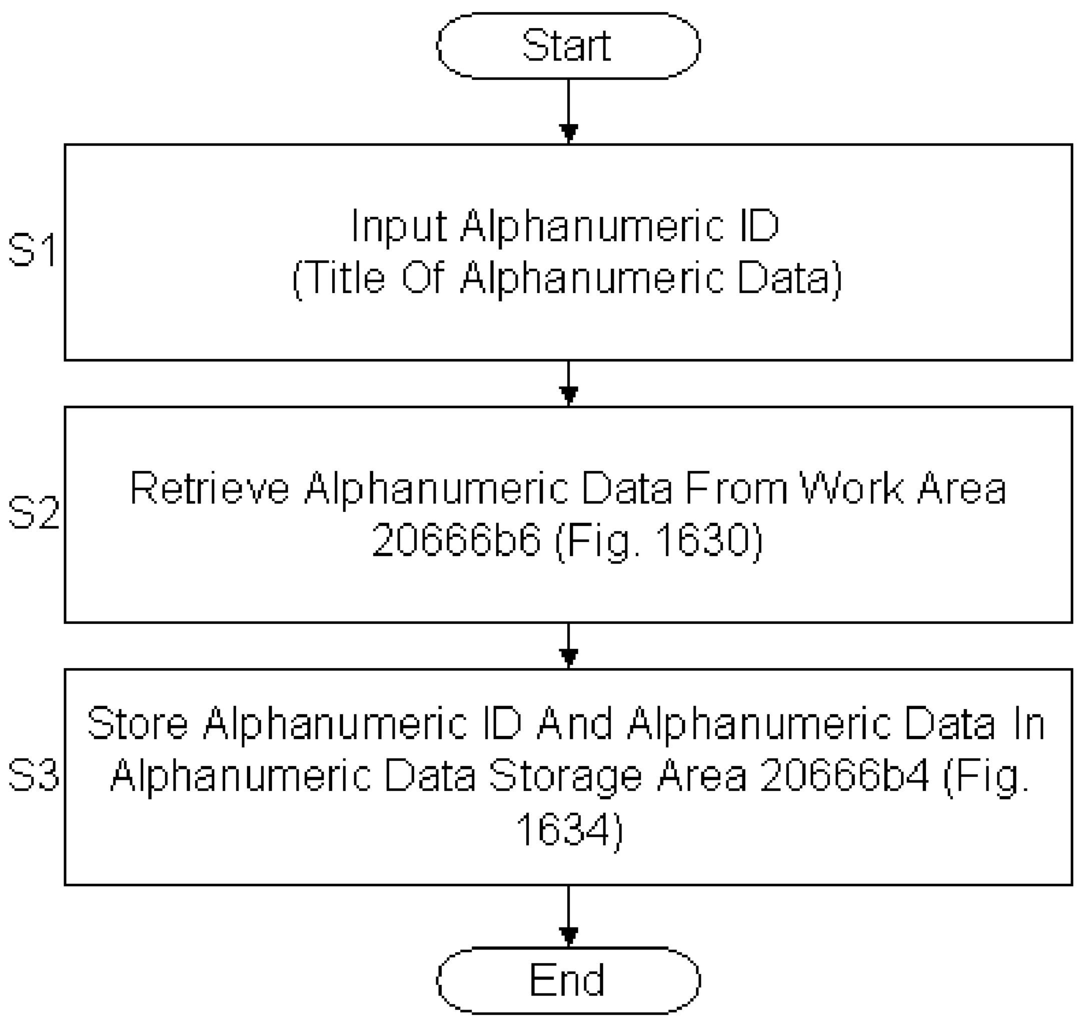

Fig. 1641
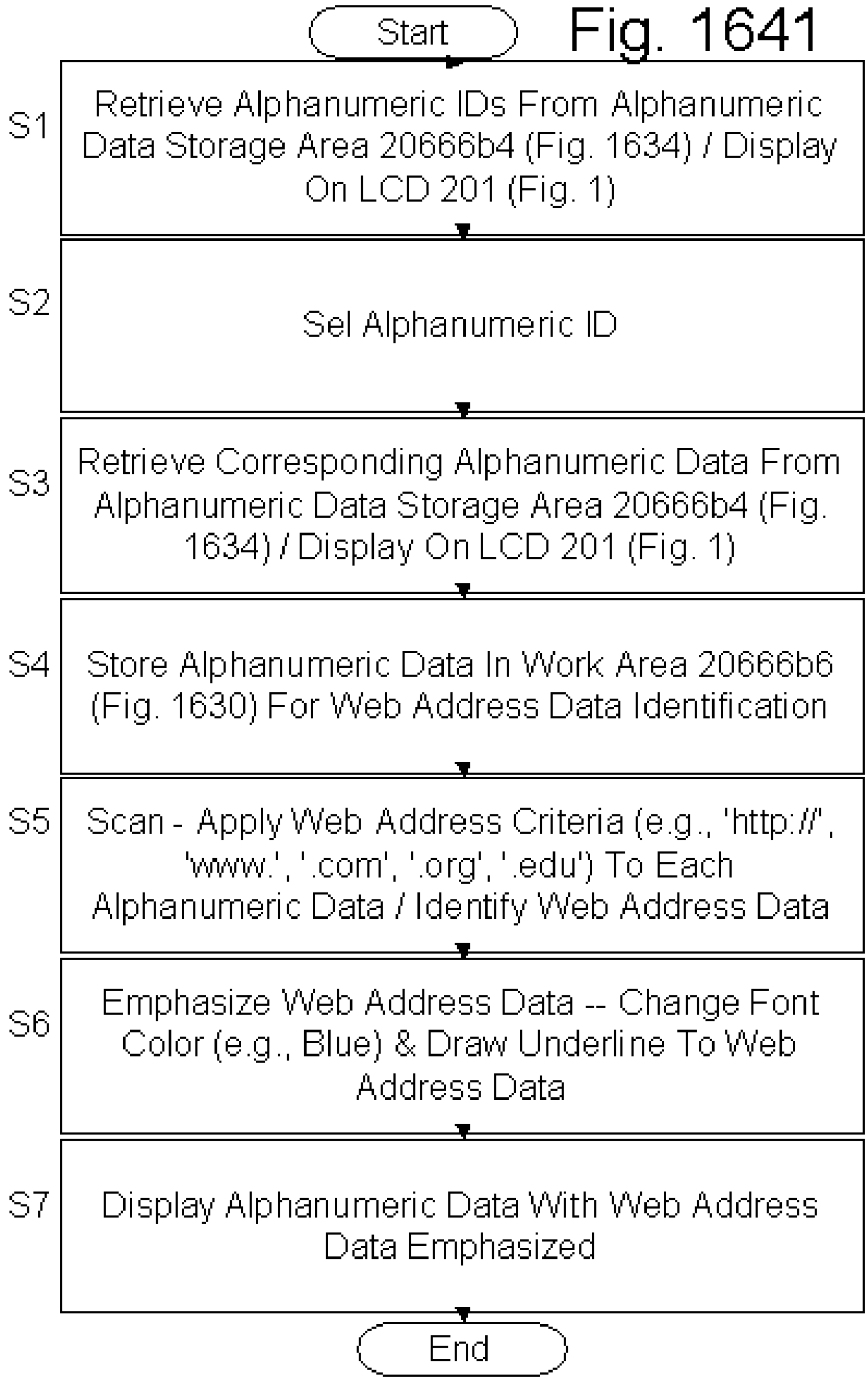

Fig. 1642
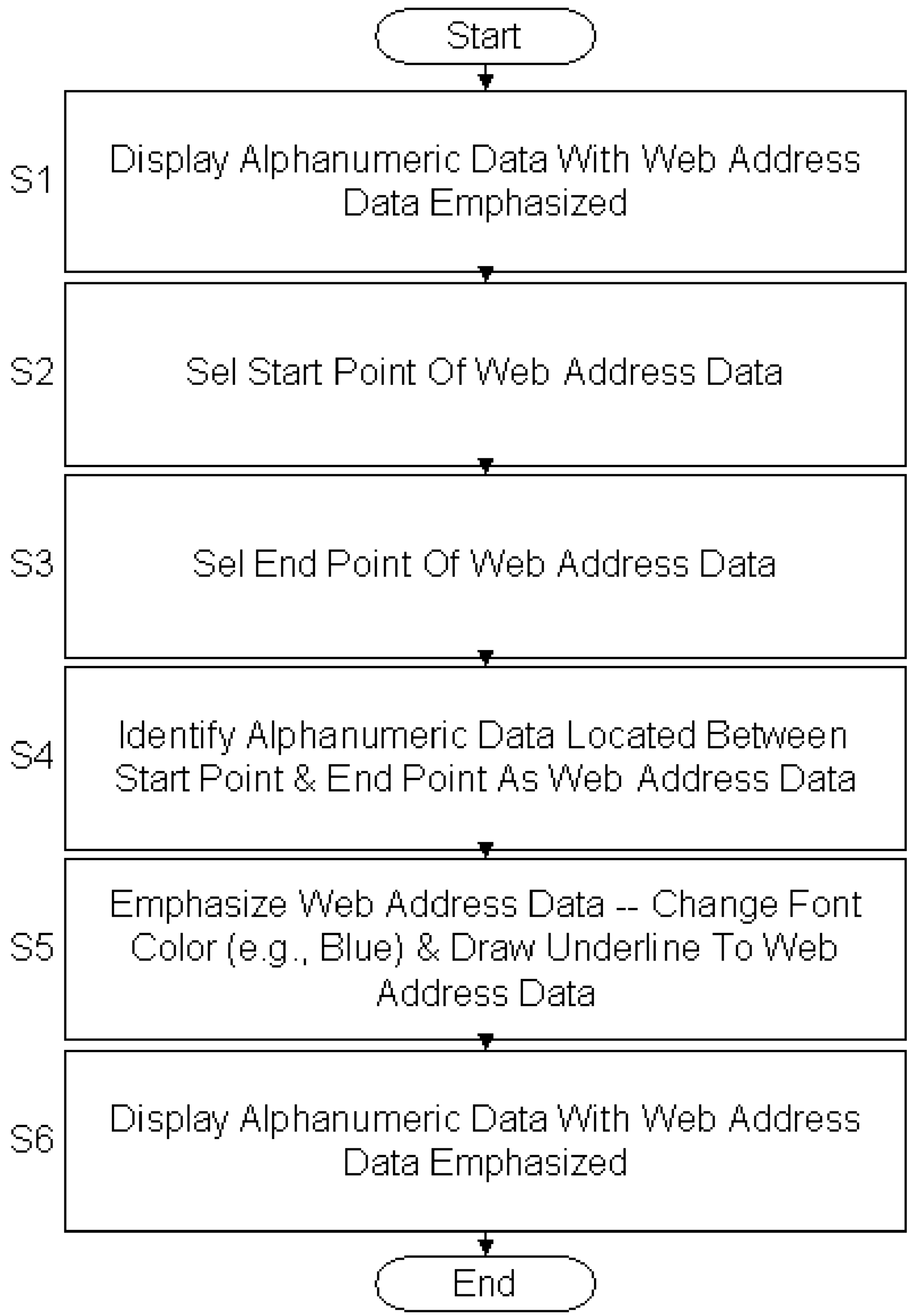

Fig. 1643
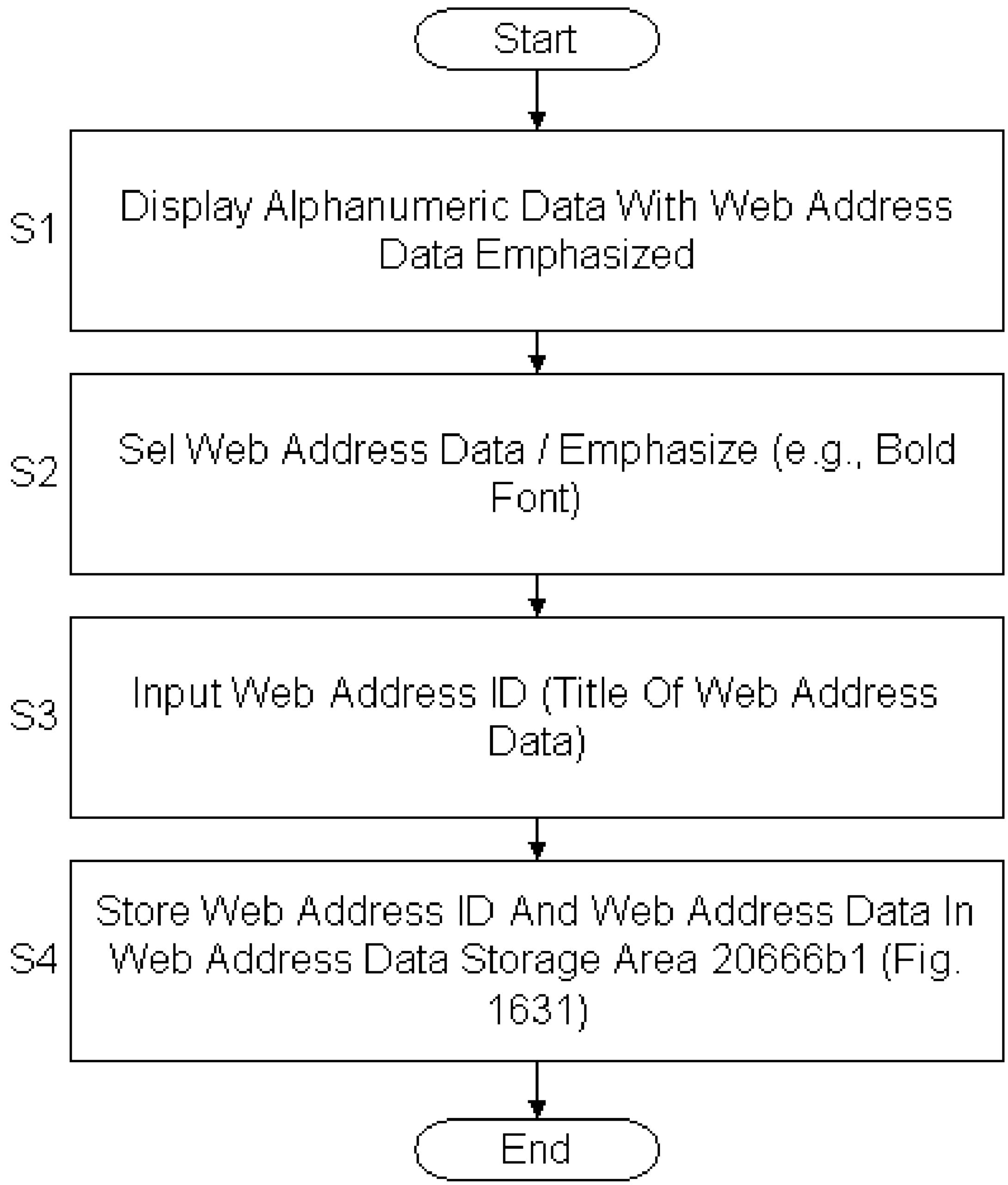

Fig. 1644
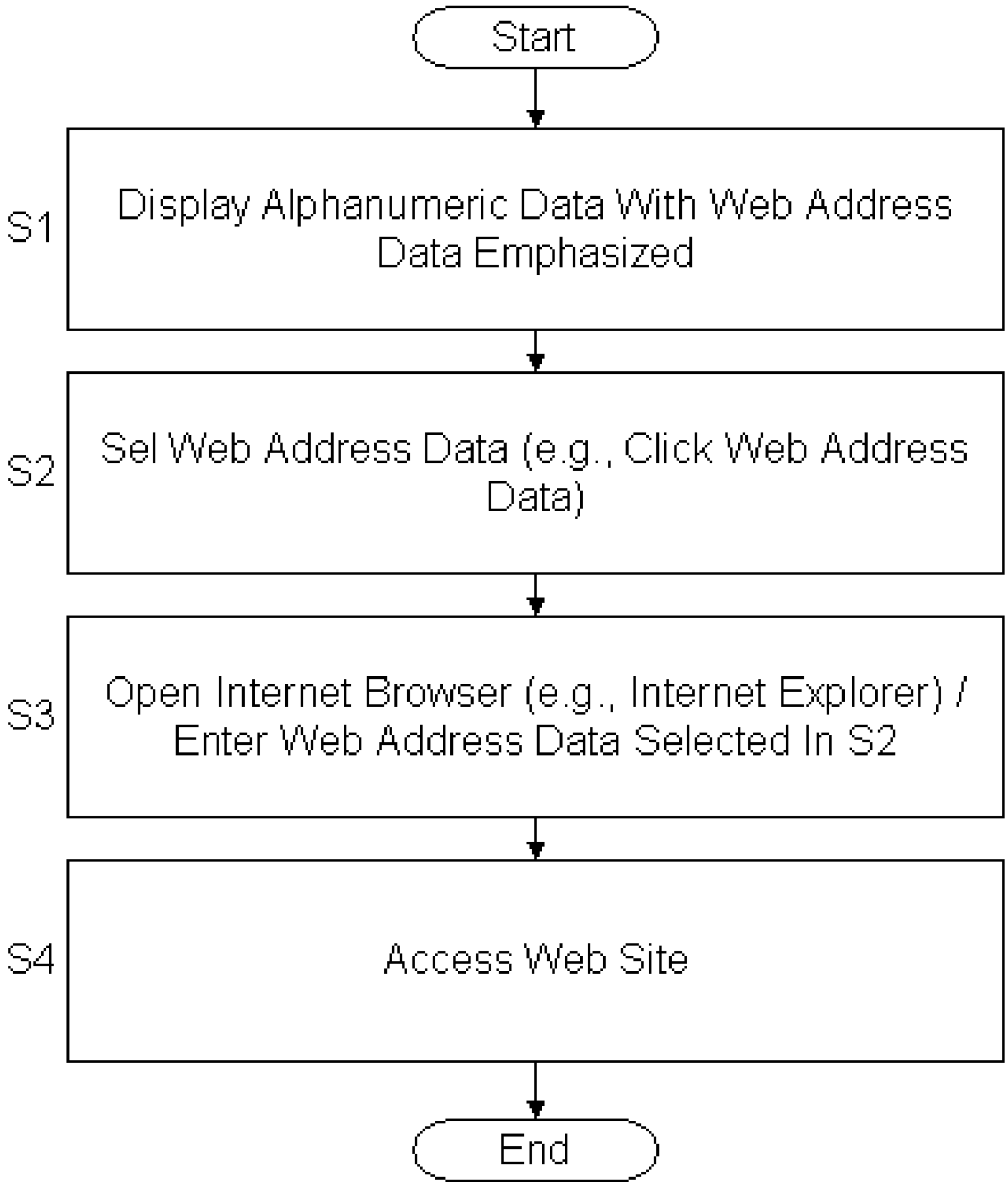

Fig. 1645
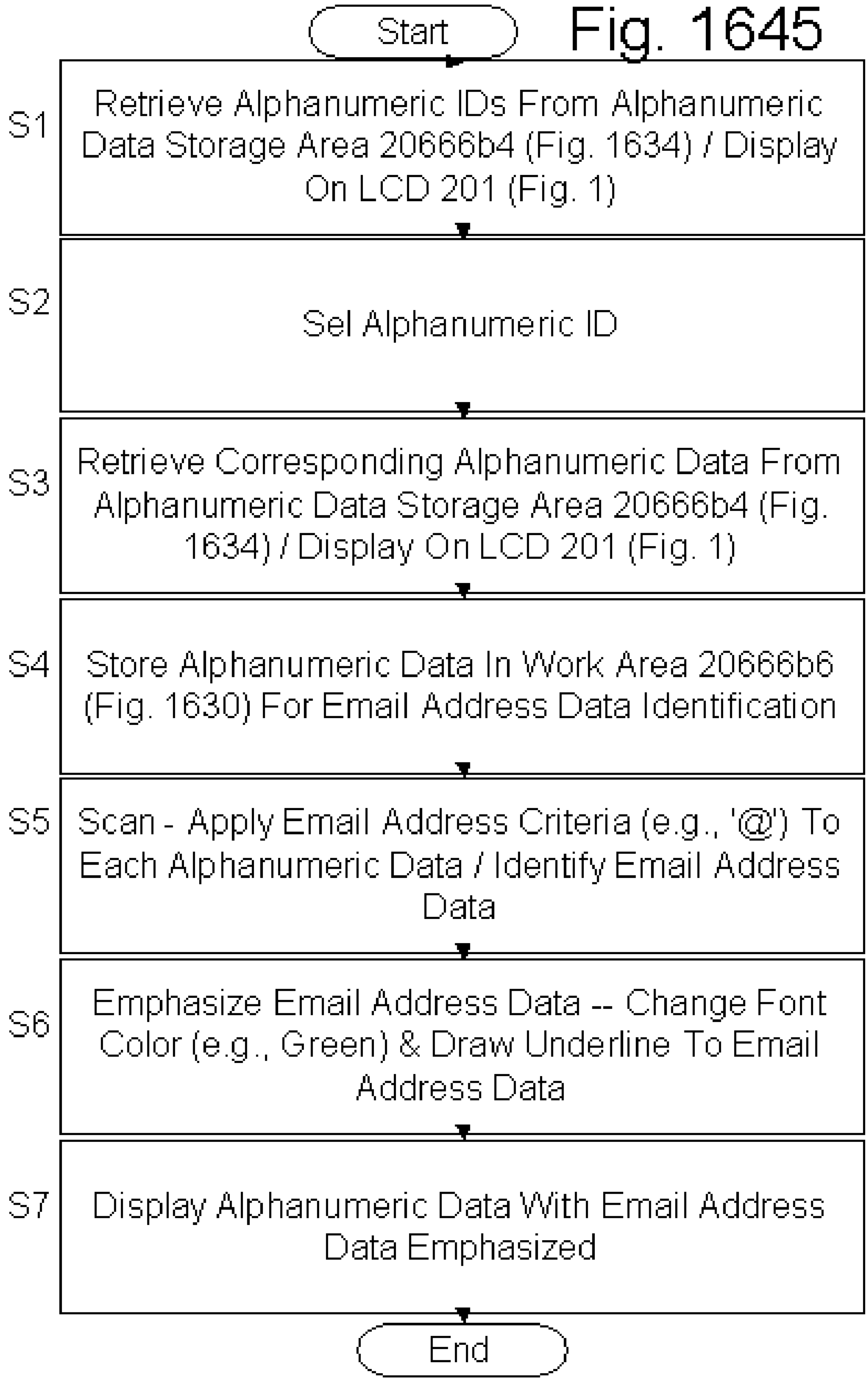

Fig. 1646
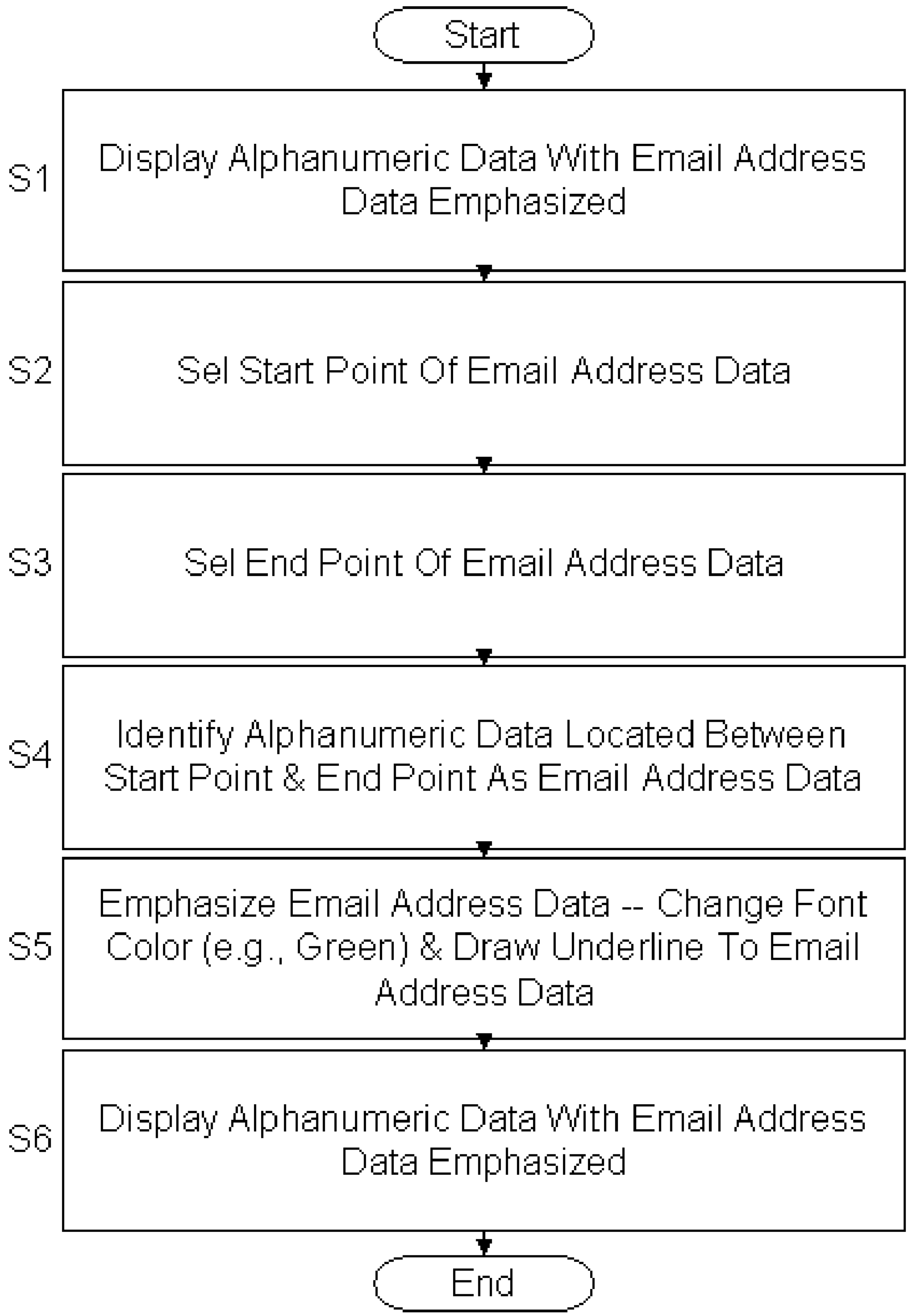

Fig. 1647
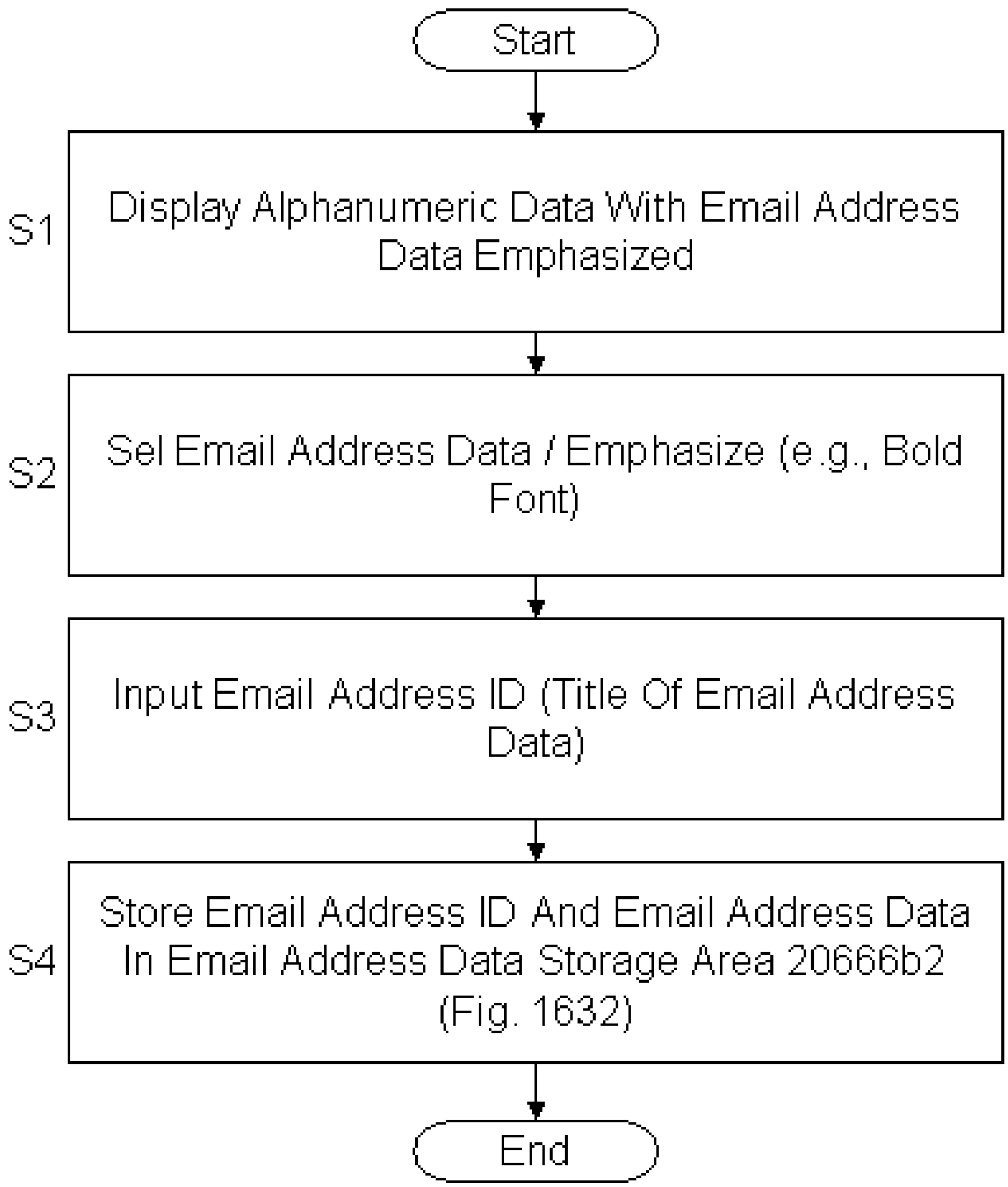

Fig. 1648
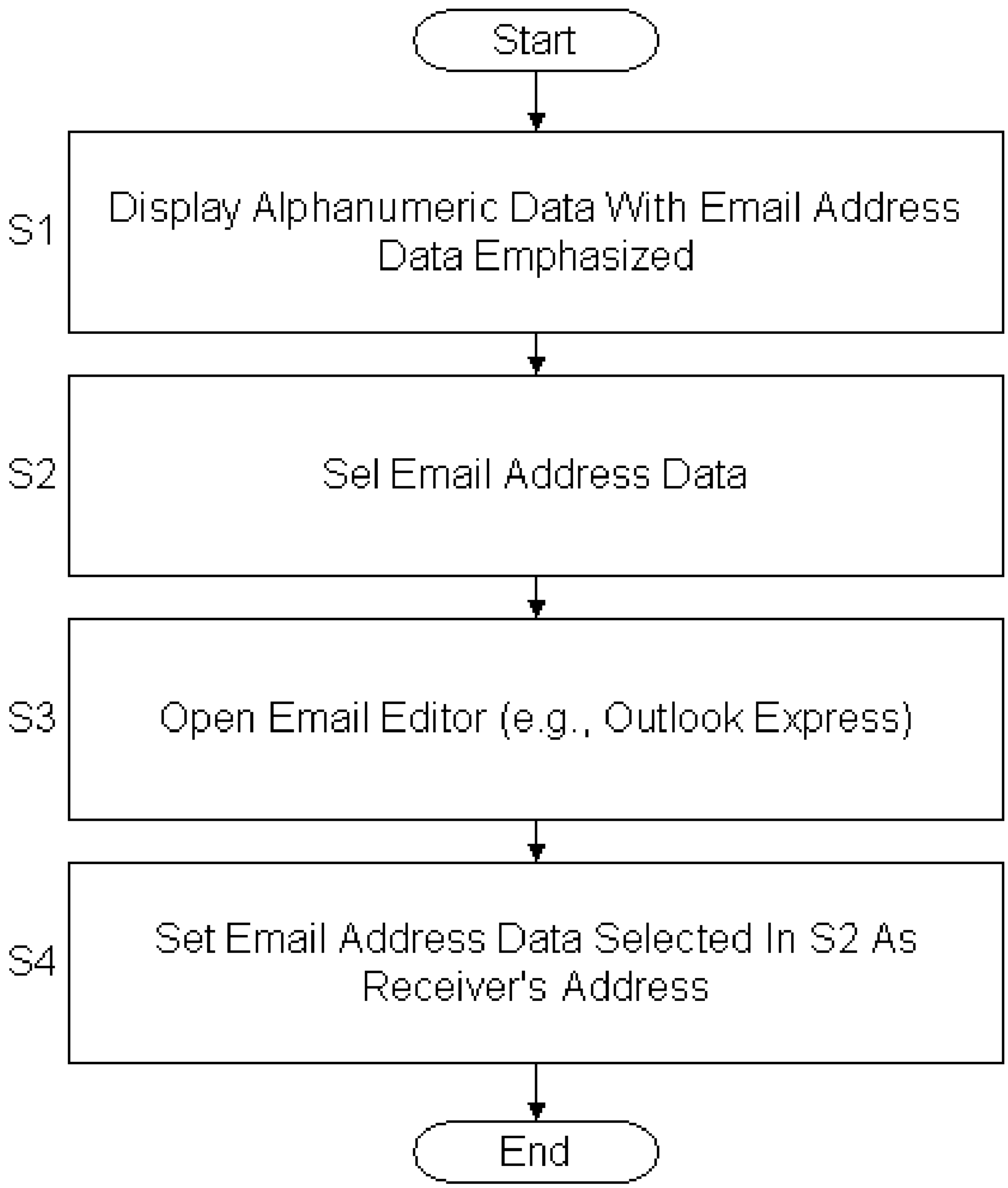

Fig. 1649
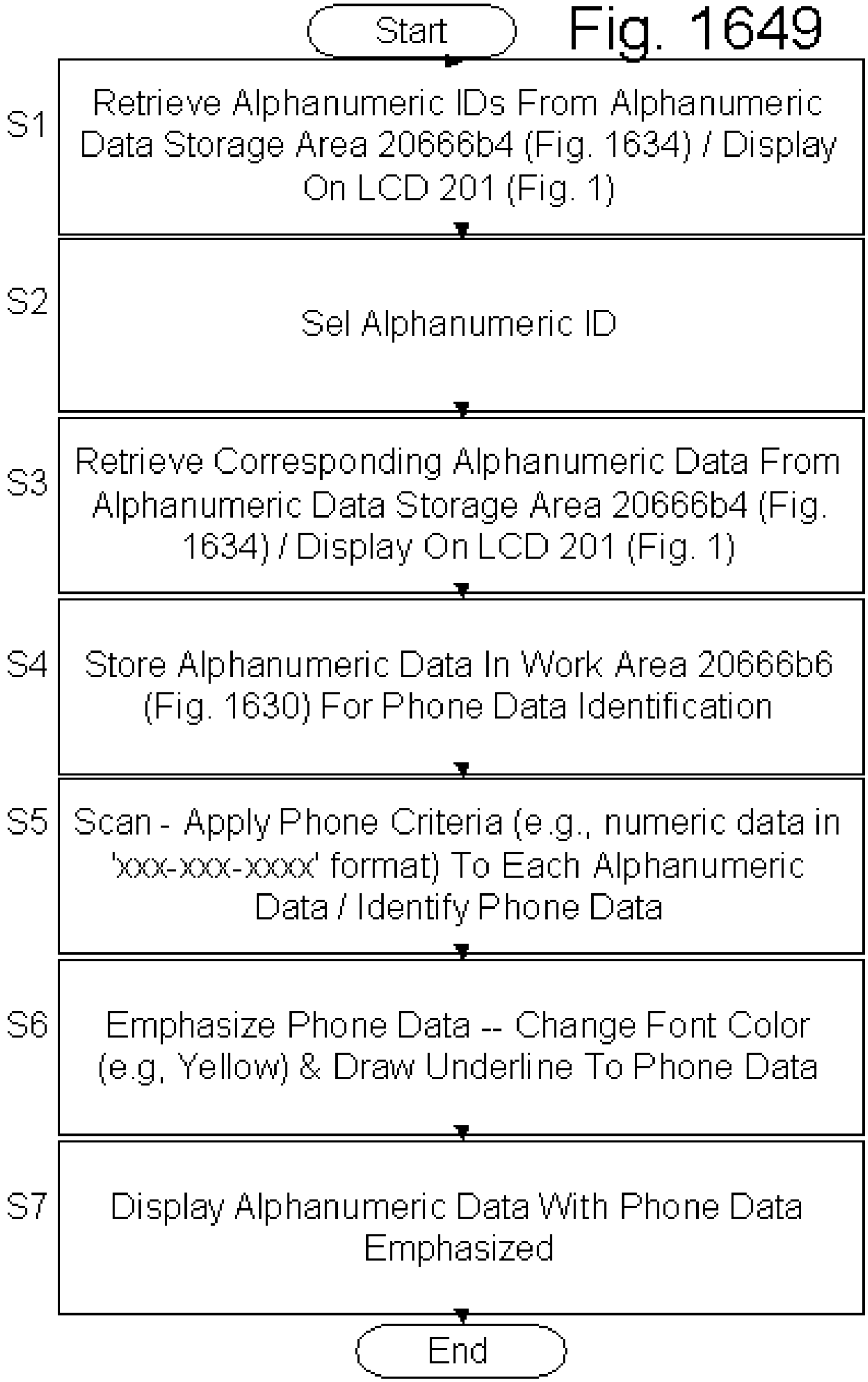

Fig. 1650
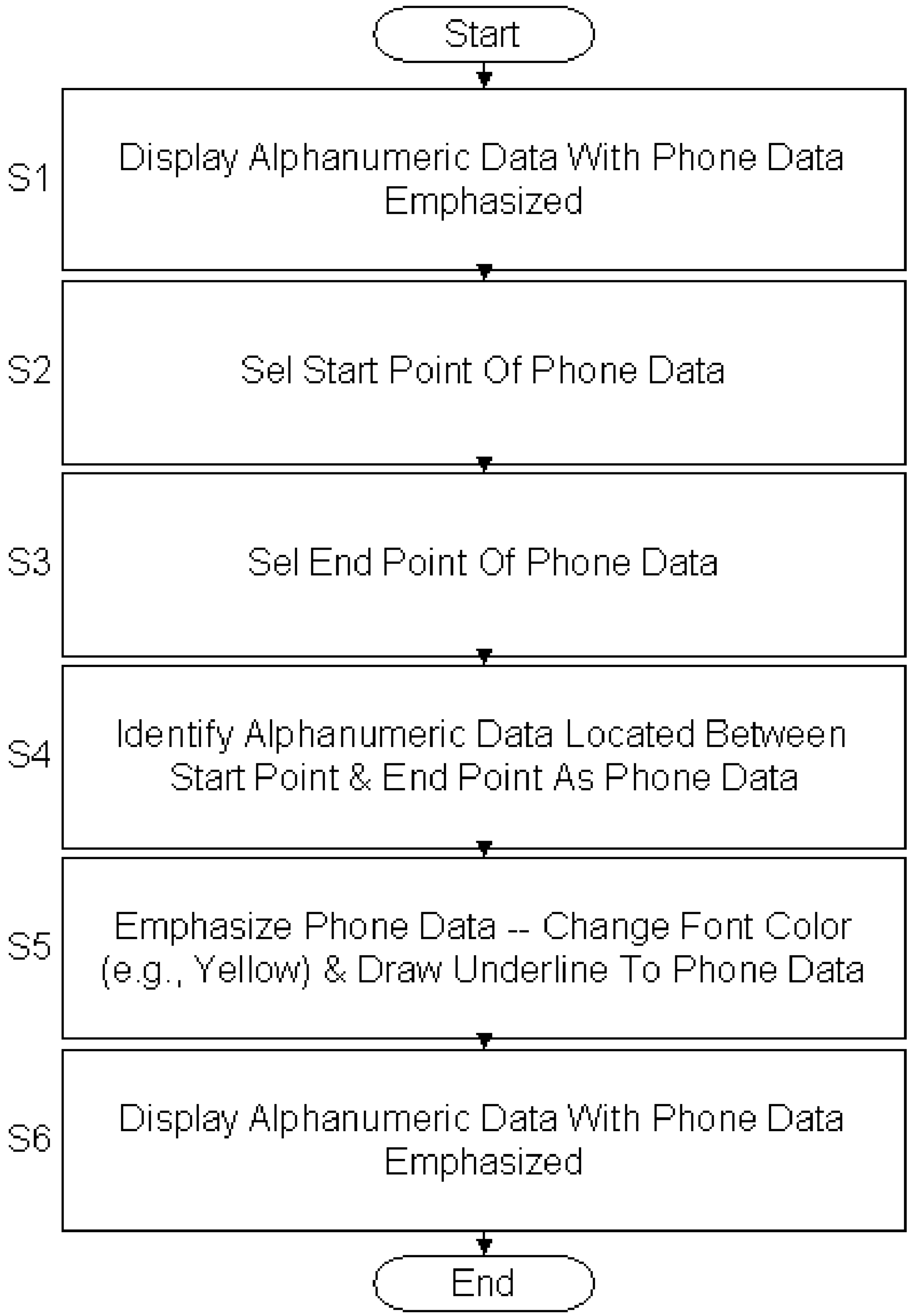

Fig. 1651
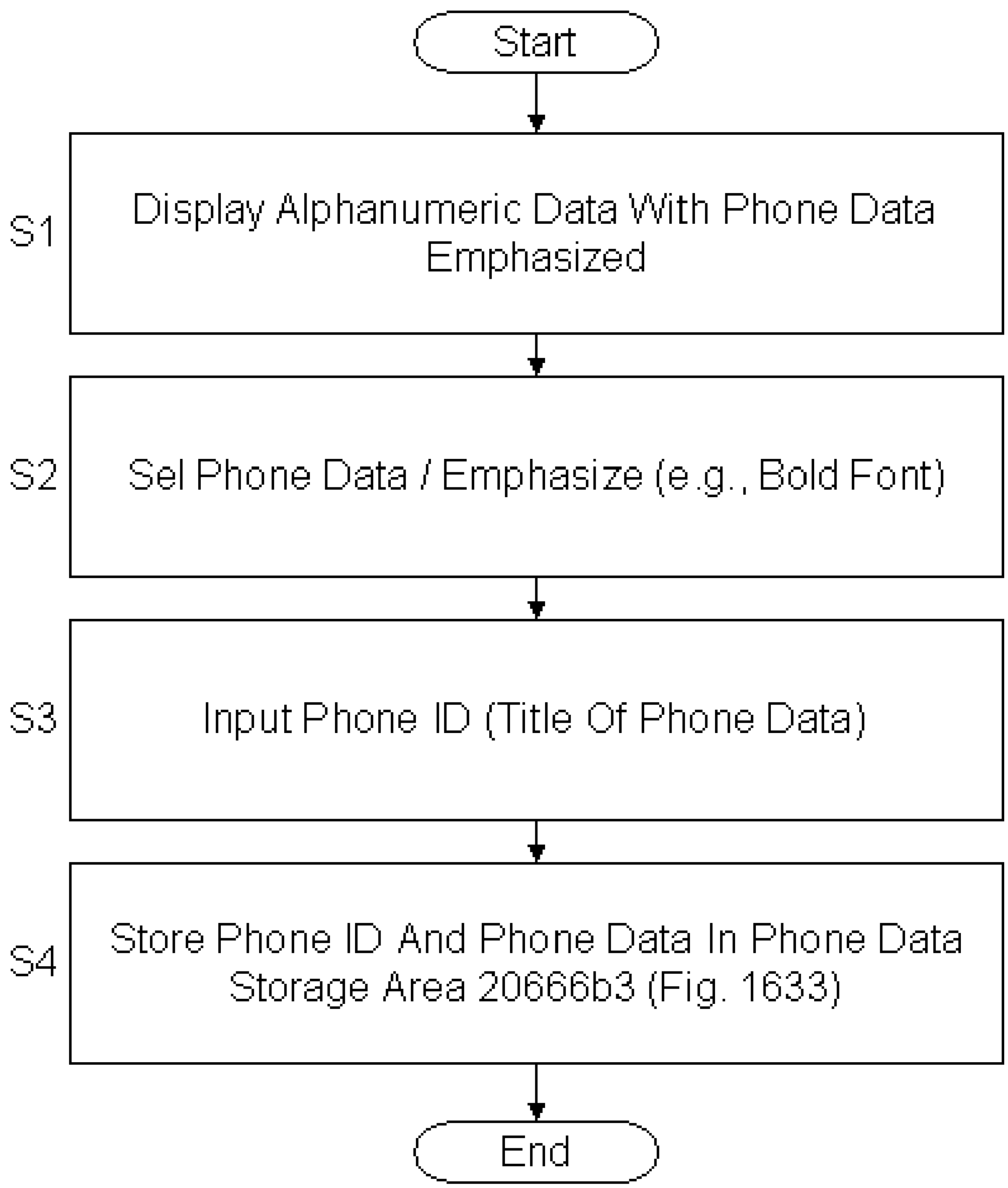

Fig. 1652
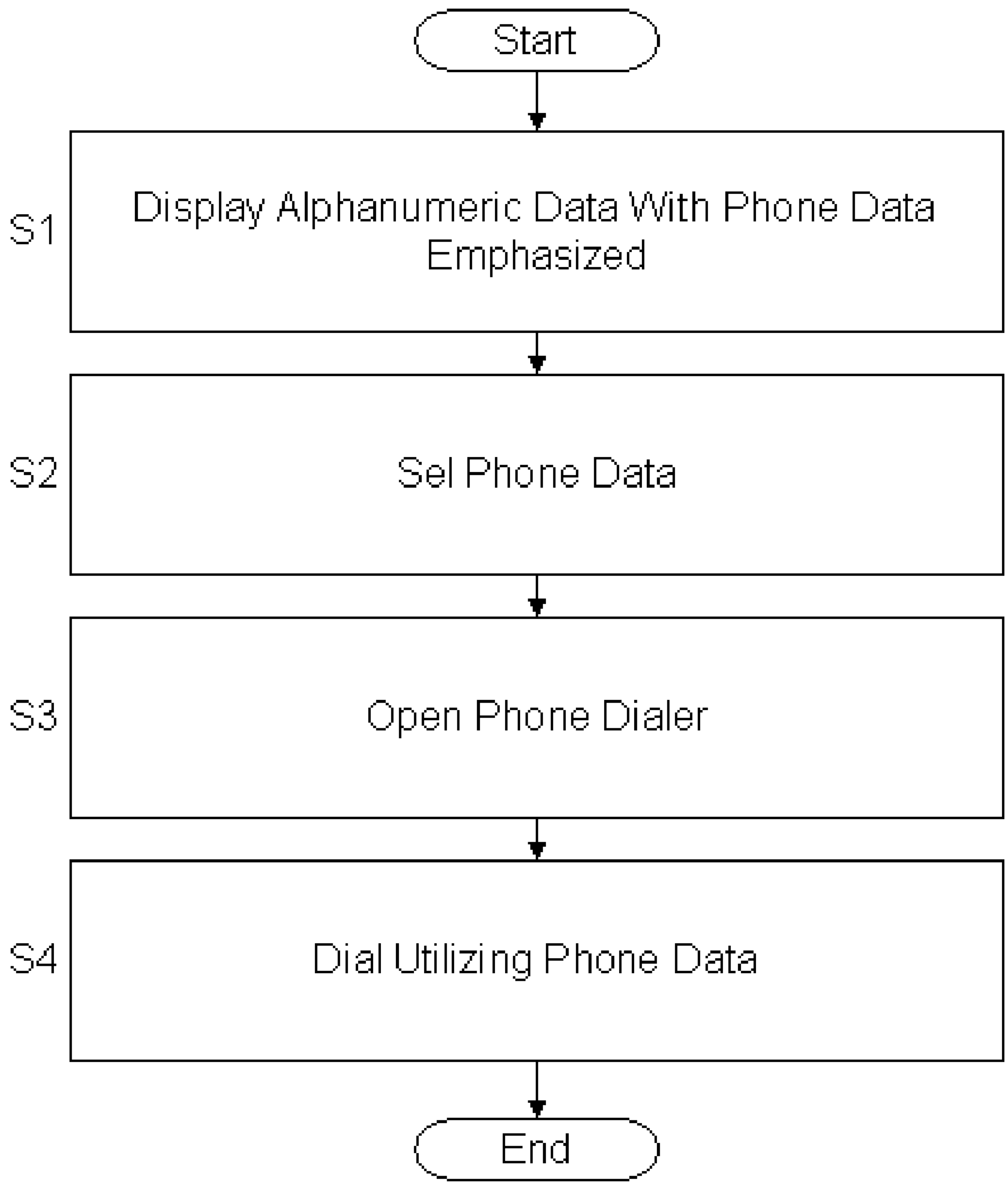

COMMUNICATION DEVICE

CROSS REFERENCE TO RELATED APPLICATIONS

This application claims the benefit of U.S. Provisional Application No. 60/481,426, filed Sep. 26, 2003, which is hereby incorporated herein by reference in its entirety.

BACKGROUND OF INVENTION

The invention relates to a communication device and more particularly to the communication device which has a capability to communicate with another communication device in a wireless fashion.

U.S. Patent Publication No. 20030184600 is introduced as a prior art of the present invention of which the summary is the following: 'A system and method for organizing shortcut icons on an electronic display device utilizing a virtual filing cabinet for storing the icons to reduce clutter and confusion on large electronic device screens, and enable organized storage of the icons to be accessed at will for smaller device display screens. At the time of creation, and at any later time, every icon can be deposited into the virtual filing cabinet with a user defined directory structure or the icon can be left displayed on the display device. A data field allows device user or the program-installer to enter a brief notation regarding the nature, functionality, and the name of the program, file, or data represented by the shortcut icon. An icon displayed on the display device screen can be deposited into virtual filing cabinet at any later time, at will, and can be called forth onto the display screen, at any later time, at will. In addition, multiple related icons can be collected into a single collective icon, with each icon accessible under the collective icon. The shortcut icon can be left on the screen, or moved off the screen and deposited into the vault, or recalled from the vault to be displayed on the display device at any time, and back and forth as often as the user desires. The present invention also provides 'icon deletion' and 'program deletion' functions through a 'pop-up' menu with each icon'.

Patent Publication No. 20020122076 is introduced as a prior art of the present invention of which the summary is the following: 'When an application program is started up, a computer system automatically creates a shortcut icon to be used to start up the application program, and automatically deletes a shortcut icon that is determined to be no longer wanted. Upon startup of the application program, program startup information is created or updated, and when a prestored shortcut creation condition is satisfied, the shortcut icon for starting up the application program is created. The created shortcut icon for starting up the application program is deleted if the computer system determines, based on a prestored shortcut deletion condition and the program startup information, that the shortcut icon is no longer wanted'.

U.S. Pat. No. 6,189,018 is introduced as a prior art of the present invention of which the summary is the following: 'Disclosed is a method for generating universal resource locator links in a graphical user interface based HTML file. The method includes the operations of selecting one of a picture object and text contained within the graphical user interface based HTML file. Once one of the picture object and text are selected, a shortcut universal resource locator icon is selected. Upon selecting the shortcut universal resource locator icon, a nested menu is displayed. Preferably, the nested menu contains a list of most recently used universal resource locators, and a list of open HTML files. Next, one of the universal resource locators is selected from the list of most recently used universal resource locators and the open HTML file from the list of open HTML files. Once selected, a link is generated from the selected one of the picture object and text contained within the graphical user interface based HTML file to one of the selected universal resource locators from the list of most recently used universal resource locators and the open HTML file'.

U.S. Pat. No. 6,091,409 is introduced as a prior art of the present invention of which the summary is the following: 'A client computer has a facility for encapsulating location information, such as a uniform resource locator (URL), for a resource that is available on a server computer. The facility is especially well-adapted for use with Internet documents. The location information for such a resource is encapsulated into an object known as an Internet shortcut. The Internet shortcut may created through a drag and drop operation from a link to the desktop. Appearing as an icon, the shortcut is used to gain access to the underlying resource. The Internet shortcut icon holds a link to a remote resource and will automatically activate the web browser when selected. The Internet shortcut icons may be implemented as objects that are visible on the desktop of the operating system. File operations such as copy, delete, and copy may be performed on the Internet shortcut icon through a context menu. In addition, Internet shortcuts may be transferred to E-mail, facsimile, floppy disk destinations through a context menu'.

U.S. Pat. No. 5,983,245 is introduced as a prior art of the present invention of which the summary is the following: 'Disclosed is a method for generating universal resource locator links in a graphical user interface based HTML file. The method includes the operations of selecting one of a picture object and text contained within the graphical user interface based HTML file. Once one of the picture object and text are selected, a shortcut universal resource locator icon is selected. Upon selecting the shortcut universal resource locator icon, a nested menu is displayed. Preferably, the nested menu contains a list of most recently used universal resource locators, and a list of open HTML files. Next, one of the universal resource locators is selected from the list of most recently used universal resource locators and the open HTML file from the list of open HTML files. Once selected, a link is generated from the selected one of the picture object and text contained within the graphical user interface based HTML file to one of the selected universal resource locators from the list of most recently used universal resource locators and the open HTML file'.

U.S. Pat. No. 5,877,765 is introduced as a prior art of the present invention of which the summary is the following: 'A client computer has a facility for encapsulating location information, such as a uniform resource locator (URL), for a resource that is available on a server computer. The facility is especially well-adapted for use with Internet documents. The location information for such a resource is encapsulated into an object known as an Internet shortcut. The Internet shortcut appears to a user as an icon that may be used to gain access to the underlying resource. The Internet shortcut icon holds a link to a remote resource and will automatically activate the web browser when selected. The Internet shortcut icons may be implemented as objects that are visible on the desktop of the operating system. File operations such as copy, delete, and copy may be performed on the Internet shortcut icon through a context menu. In addition, Internet shortcuts may be transferred to E-mail, facsimile, floppy disk destinations through a context menu'.

However, the foregoing pieces of prior art do not disclose the method for a communication device comprising the phone communication device remote controlling step, wherein, in response to the user entering the user instruction by the phone, the communication device receives a communication device controlling command via a network to which the communication device is connected in a wireless fashion, and the communication device implements a communication device controlling task in response to the communication device controlling command, thereby the communication device is remotely controlled via the user instruction entered by the phone, and thereby a communication device controlled notice which corresponds to the user instruction is output from the phone.

SUMMARY OF INVENTION

It is an object of the present invention to provide a device capable of implementing a plurality of functions.

It is another object of the present invention to provide merchandise to merchants attractive to the consumers in the U.S.

It is another object of the present invention to provide mobility to the users of communication device.

It is another object of the present invention to provide more convenience to the users of communication device or any tangible thing in which the communication device is fixedly or detachably installed.

It is another object of the present invention to overcome the shortcomings associated with the foregoing prior arts.

It is another object of the present invention to provide a device capable to implement a plurality of modes, i.e., the voice recognition tag mode and the shortcut icon displaying mode.

The present invention introduces the method for a communication device comprising the phone communication device remote controlling step, wherein, in response to the user entering the user instruction by the phone, the communication device receives a communication device controlling command via a network to which the communication device is connected in a wireless fashion, and the communication device implements a communication device controlling task in response to the communication device controlling command, thereby the communication device is remotely controlled via the user instruction entered by the phone, and thereby a communication device controlled notice which corresponds to the user instruction is output from the phone.

BRIEF DESCRIPTION OF DRAWINGS

The above and other aspects, features, and advantages of the invention will be better understood by reading the following more particular description of the invention, presented in conjunction with the following drawings, wherein:

FIG. 8 is a simplified illustration illustrating an exemplary embodiment of the present invention.

FIG. 9 is a simplified illustration illustrating an exemplary embodiment of the present invention.

FIG. 10 is a simplified illustration illustrating an exemplary embodiment of the present invention.

FIG. 45 is a block diagram illustrating an exemplary embodiment of the present invention.

FIG. 96 is a simplified illustration of contents and items shown on display.

FIG. 97 is a simplified illustration of contents and items shown on display.

FIG. 98 is a flowchart illustrating an exemplary embodiment of the present invention.

FIG. 99 is a block diagram illustrating an exemplary embodiment of the present invention.

FIG. 100 is a block diagram illustrating an exemplary embodiment of the present invention.

FIG. 101 is a block diagram illustrating an exemplary embodiment of the present invention.

FIG. 102 is a simplified illustration of contents and items shown on display.

FIG. 103 is a block diagram illustrating an exemplary embodiment of the present invention.

FIG. 104 is a flowchart illustrating an exemplary embodiment of the present invention.

FIG. 105 is a simplified illustration of contents and items shown on display.

FIG. 106 is a block diagram illustrating an exemplary embodiment of the present invention.

FIG. 107 is a flowchart illustrating an exemplary embodiment of the present invention.

Figure 108:
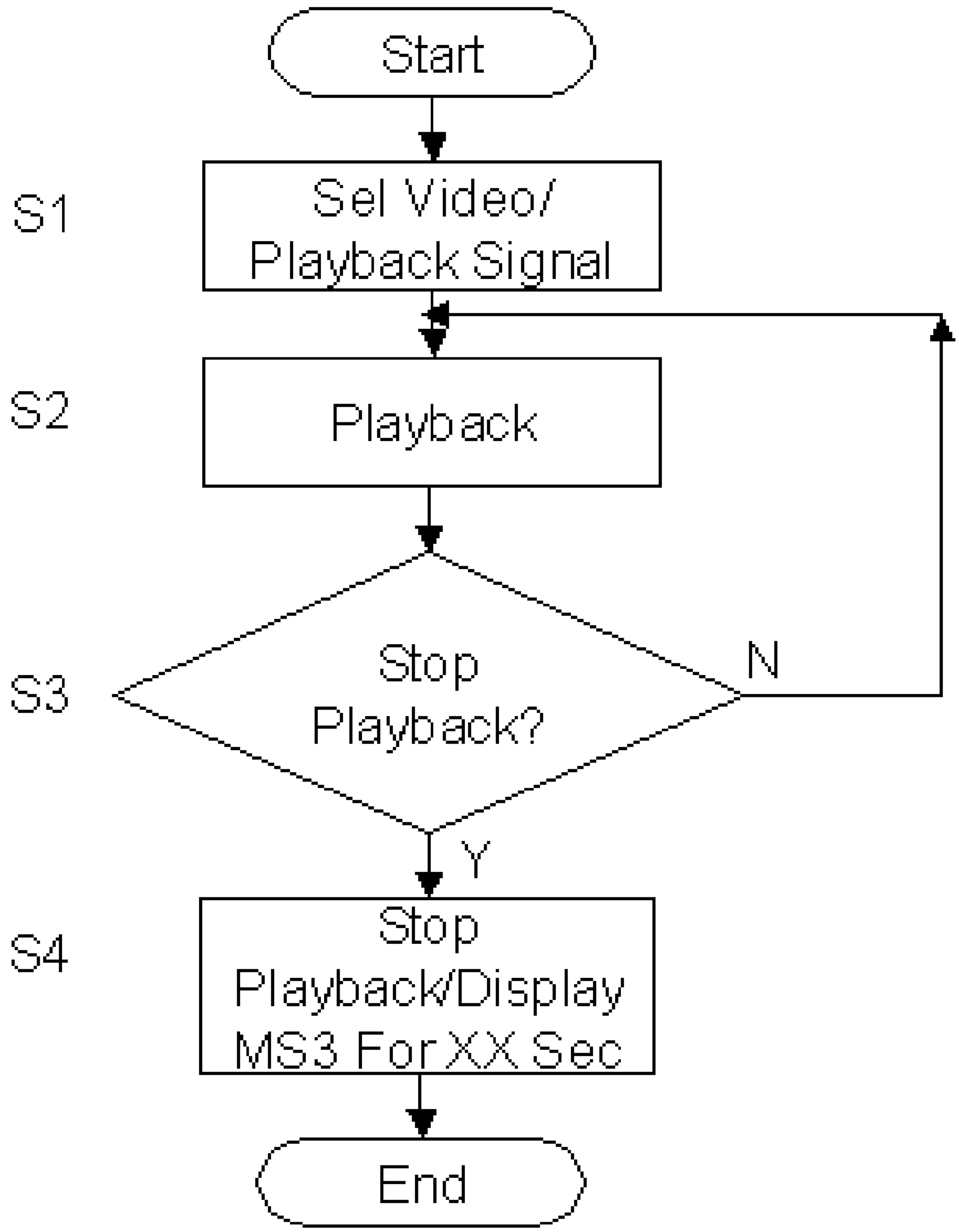

FIG. 108 is a flowchart illustrating an exemplary embodiment of the present invention.

Figure 109:
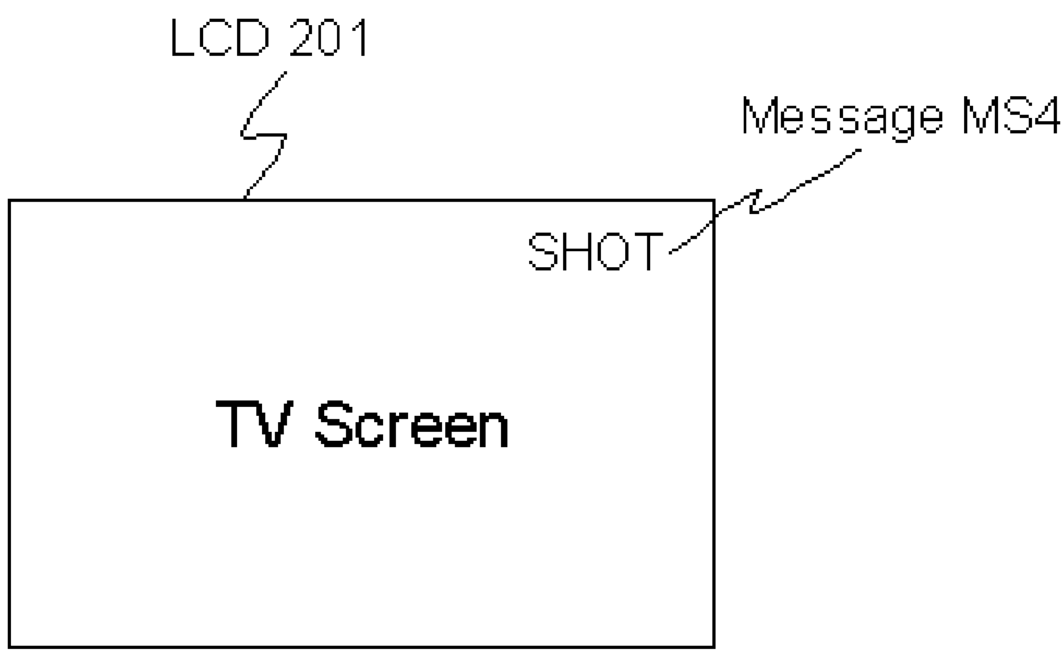

FIG. 109 is a simplified illustration of contents and items shown on display.

Figure 110:
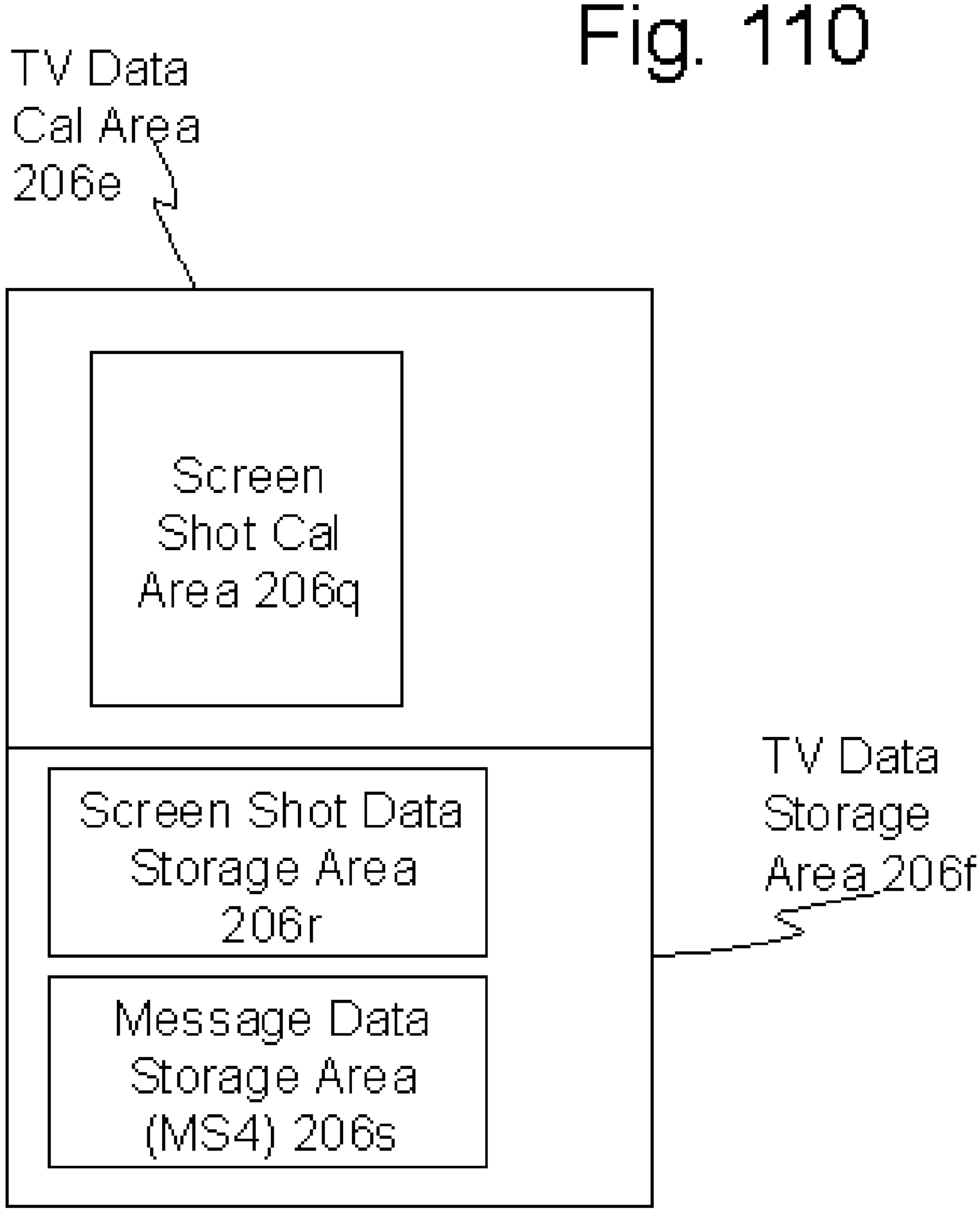

FIG. 110 is a block diagram illustrating an exemplary embodiment of the present invention.

Figure 111:
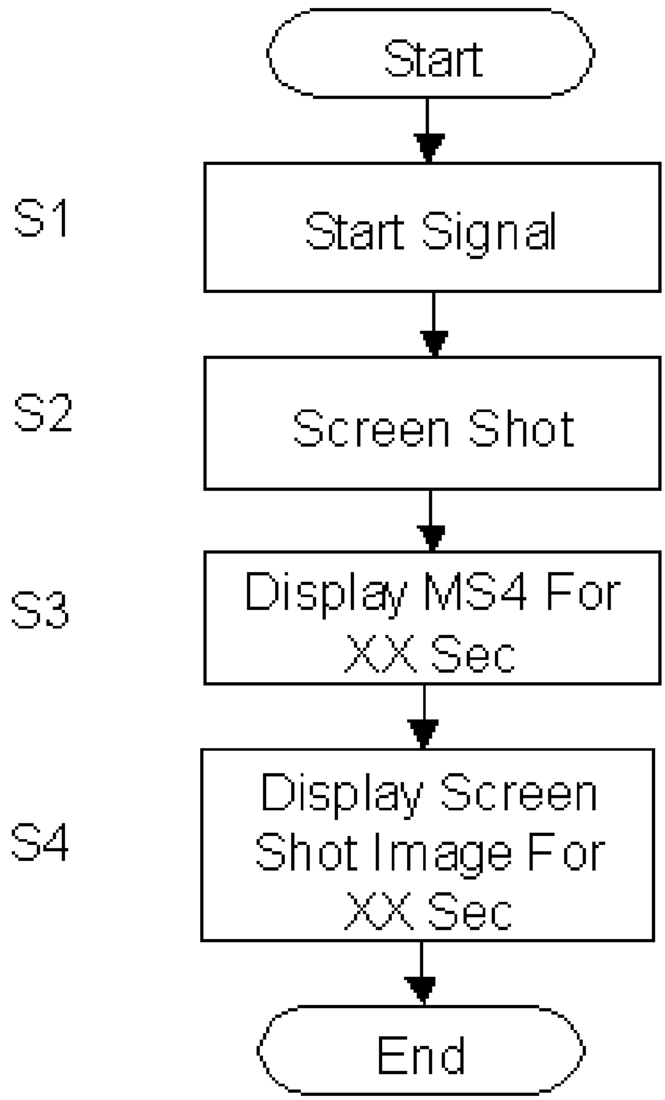

FIG. 111 is a flowchart illustrating an exemplary embodiment of the present invention.

Figure 112:
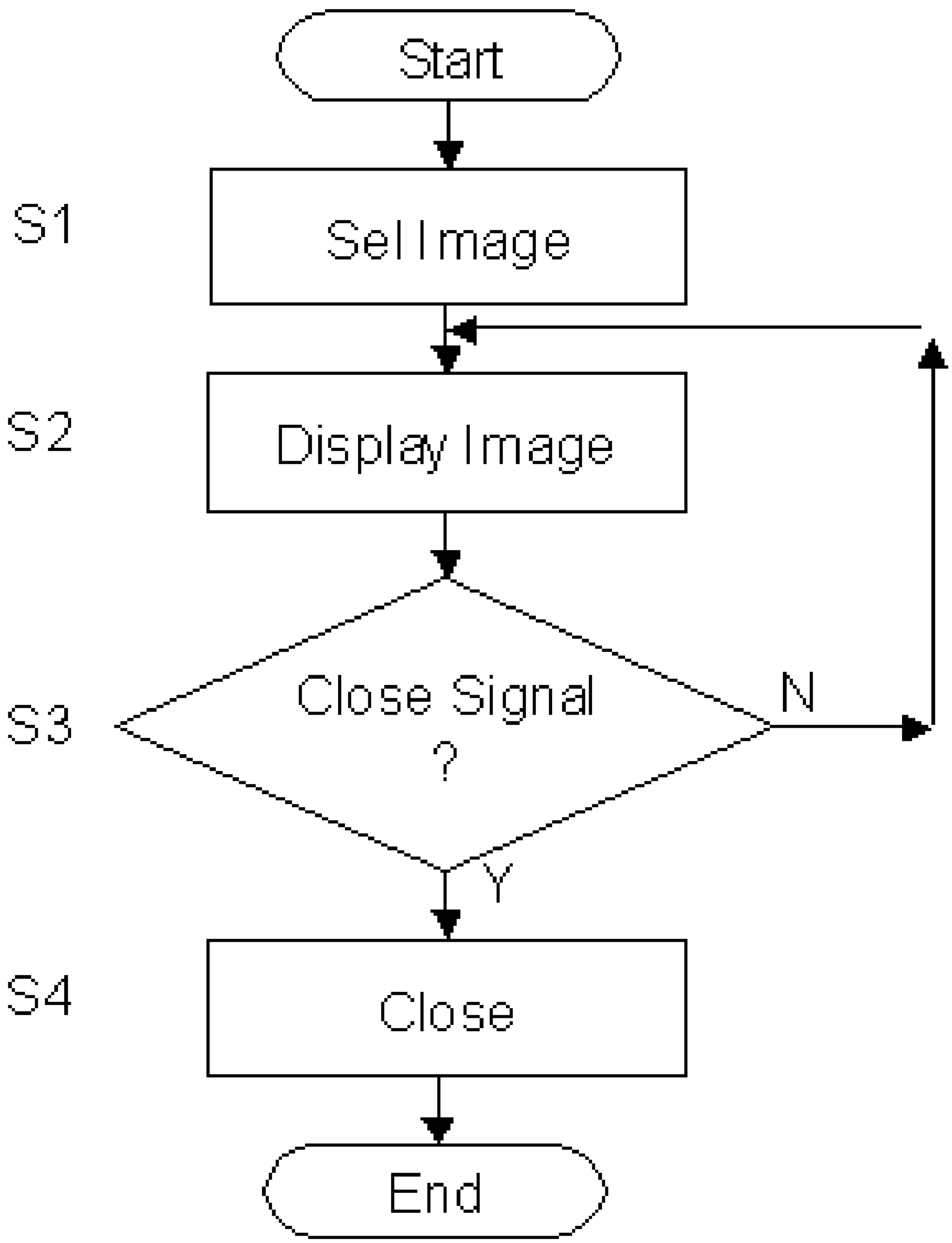

FIG. 112 is a flowchart illustrating an exemplary embodiment of the present invention.

Figure 113:
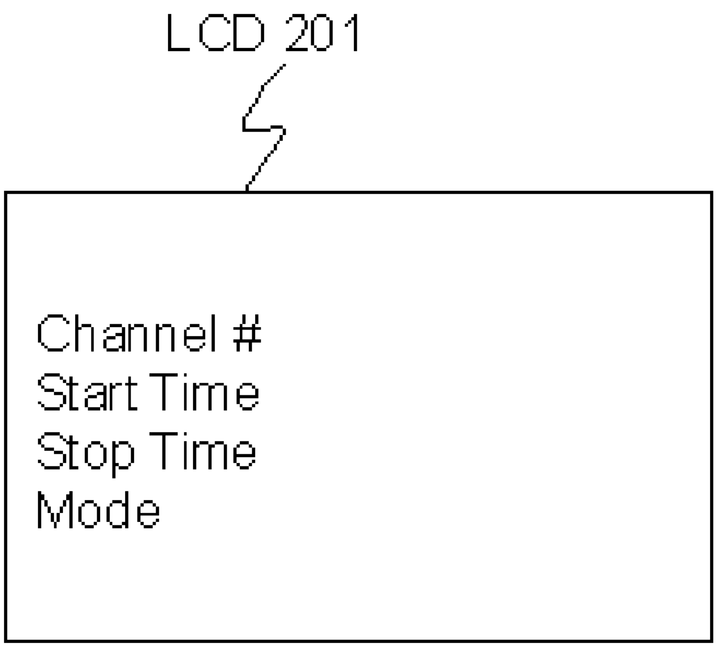

FIG. 113 is a simplified illustration of contents and items shown on display.

Figure 114:
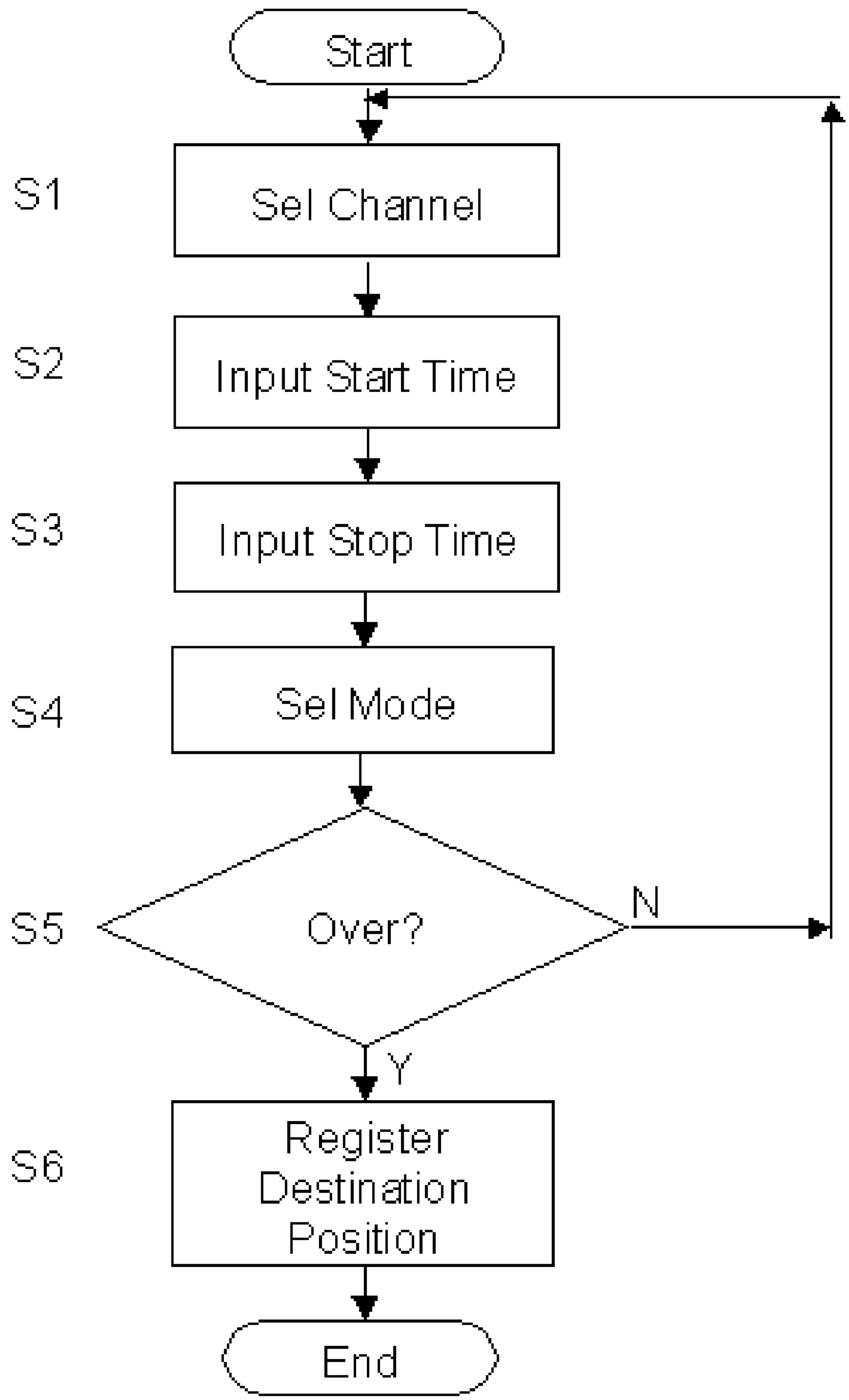

FIG. 114 is a flowchart illustrating an exemplary embodiment of the present invention.

Figure 115:
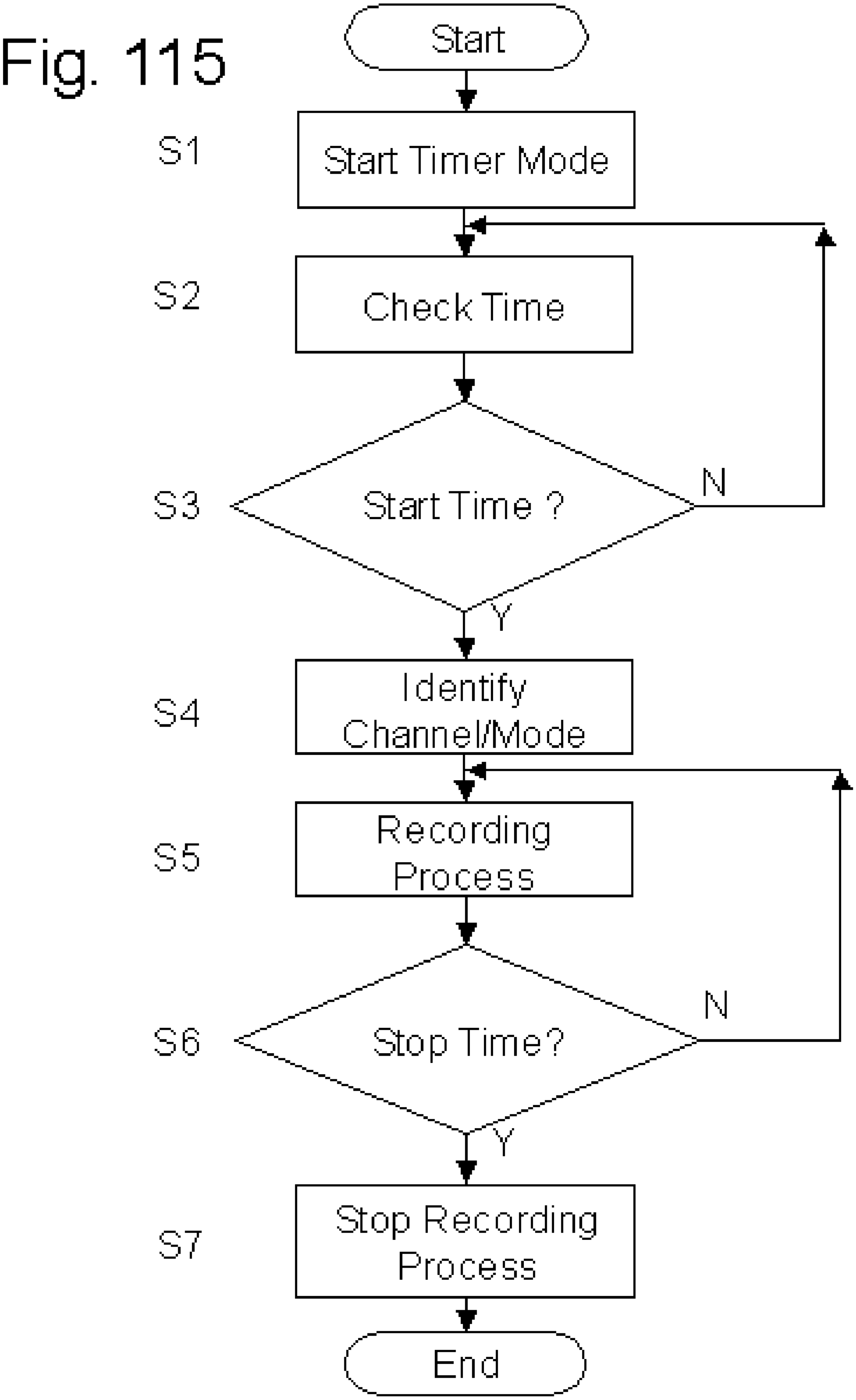

FIG. 115 is a flowchart illustrating an exemplary embodiment of the present invention.

Figure 116:
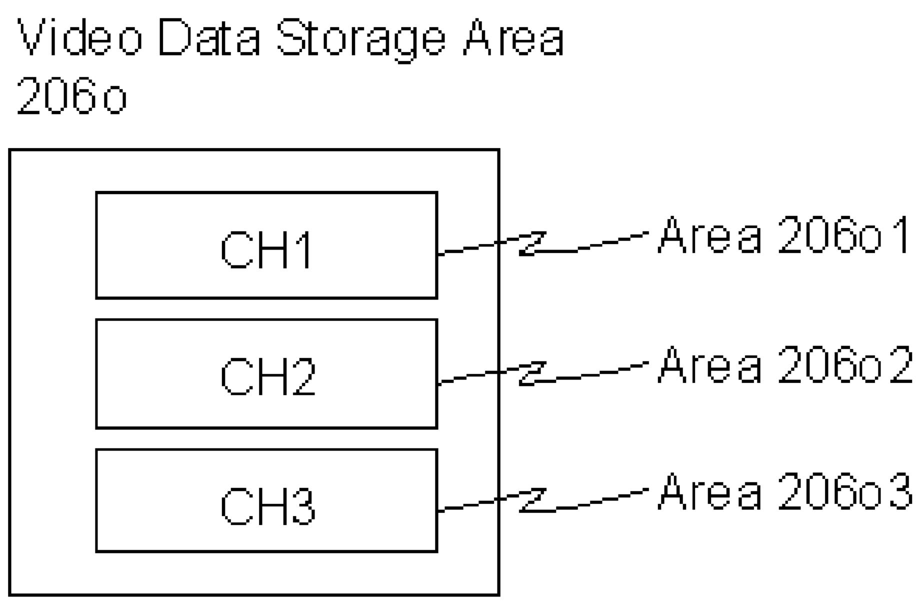

FIG. 116 is a block diagram illustrating an exemplary embodiment of the present invention.

Figure 117:
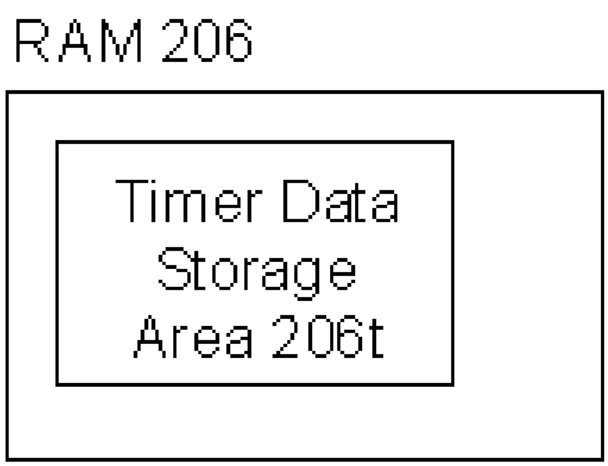

FIG. 117 is a block diagram illustrating an exemplary embodiment of the present invention.

Figure 118:
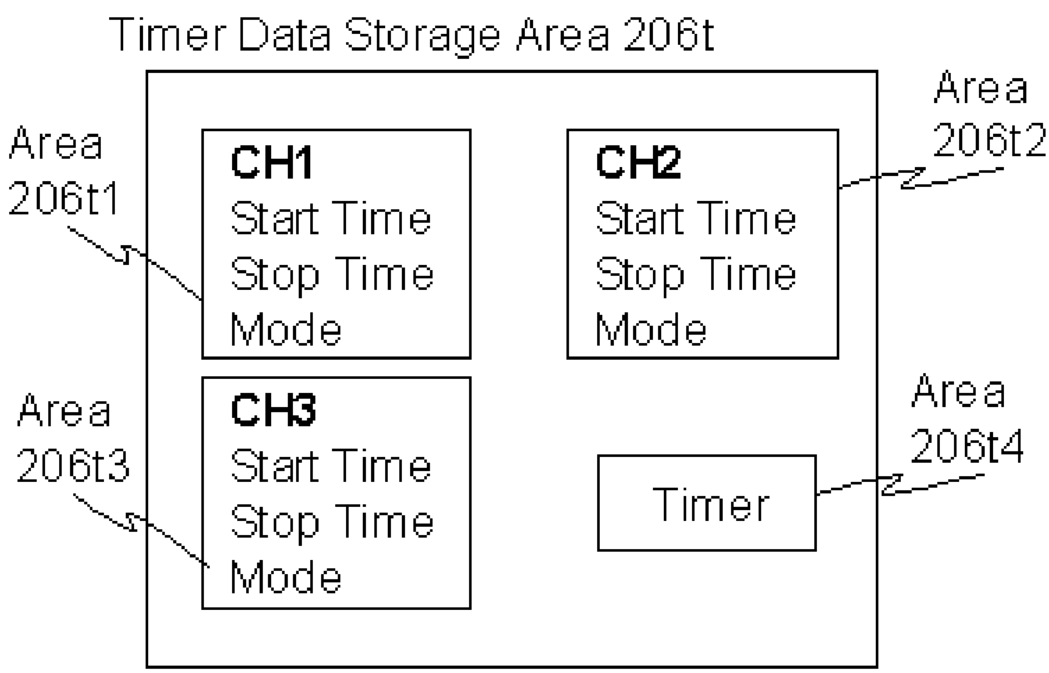

FIG. 118 is a block diagram illustrating an exemplary embodiment of the present invention.

Figure 119:
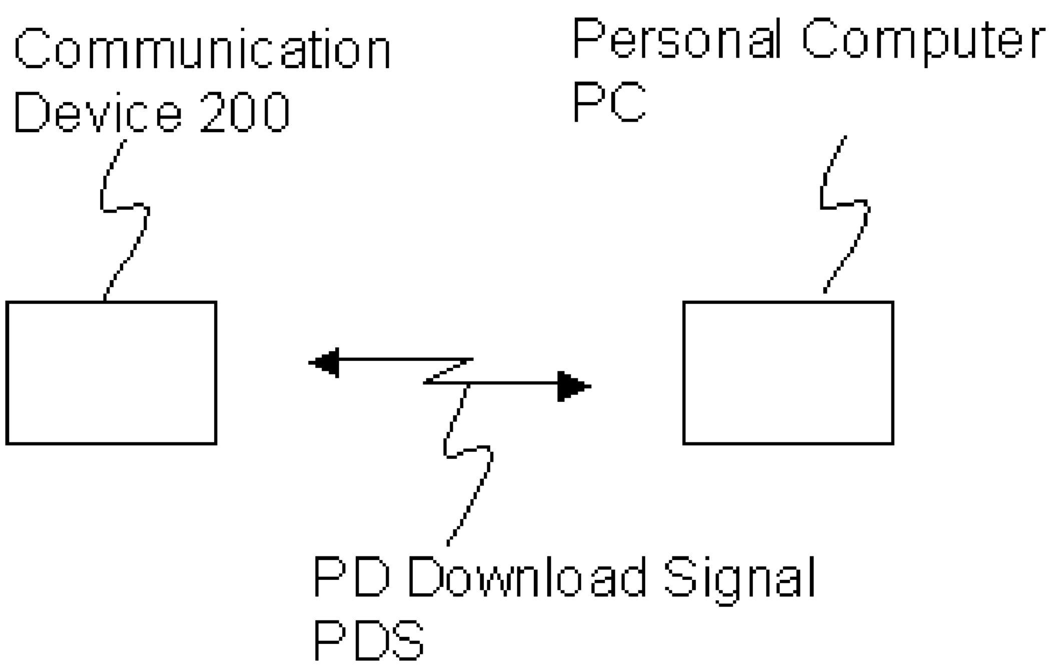

FIG. 119 is a simplified illustration illustrating an exemplary embodiment of the present invention.

Figure 120:
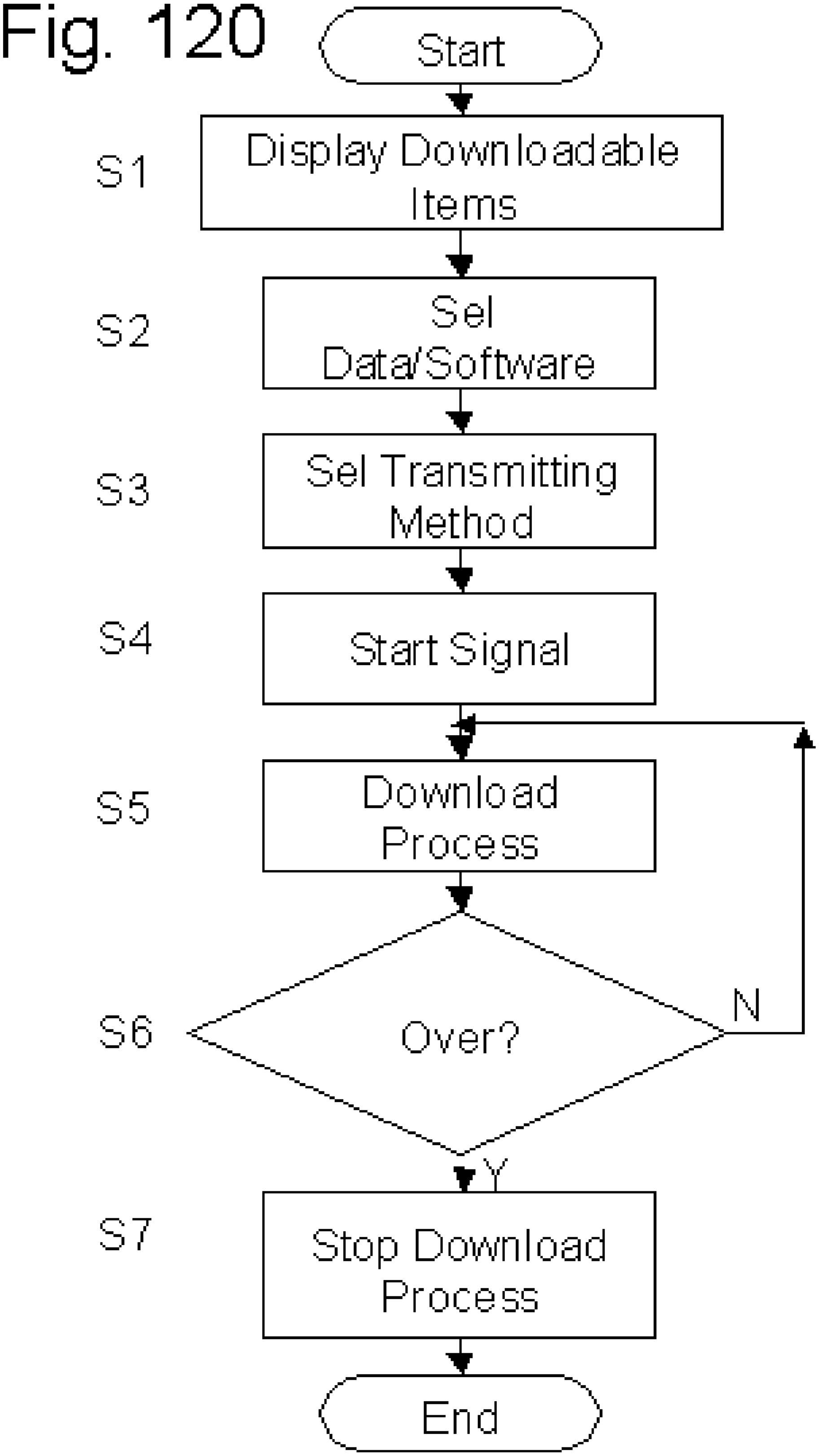

FIG. 120 is a flowchart illustrating an exemplary embodiment of the present invention.

Figure 121:
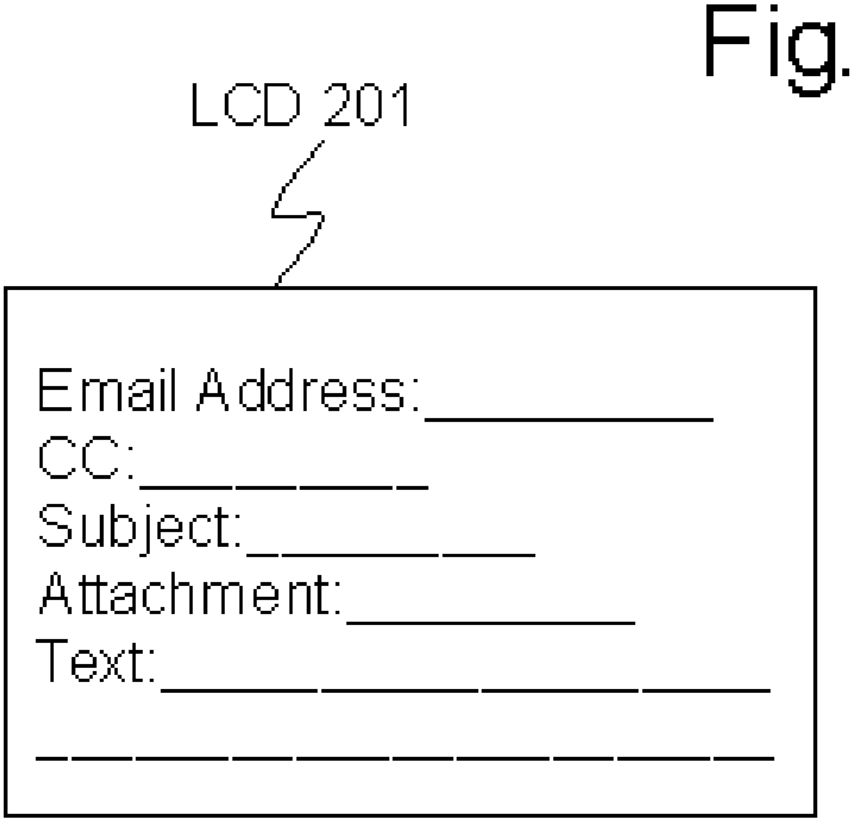

FIG. 121 is a simplified illustration of contents and items shown on display.

Figure 122:
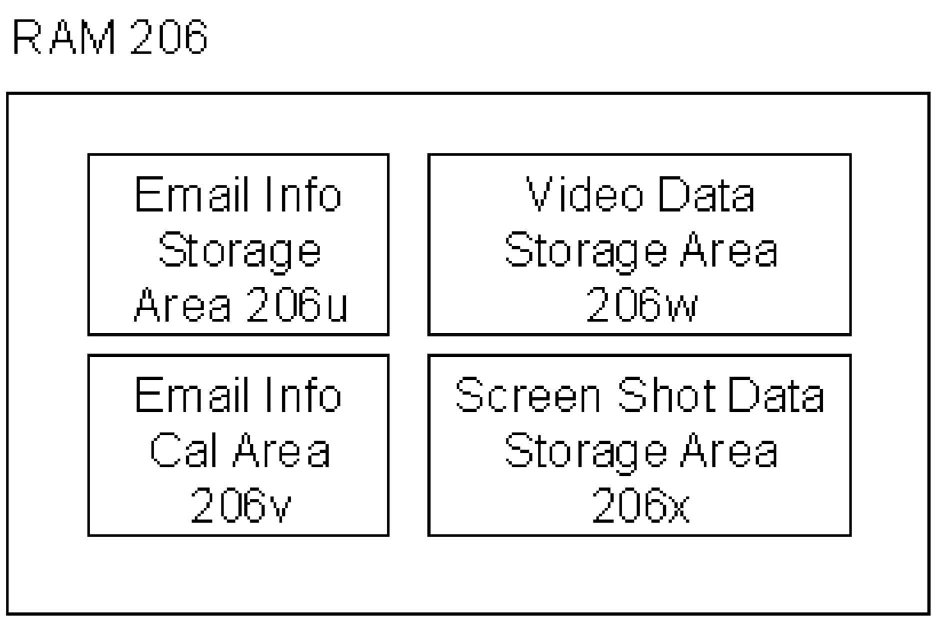

FIG. 122 is a block diagram illustrating an exemplary embodiment of the present invention.

Figure 123:
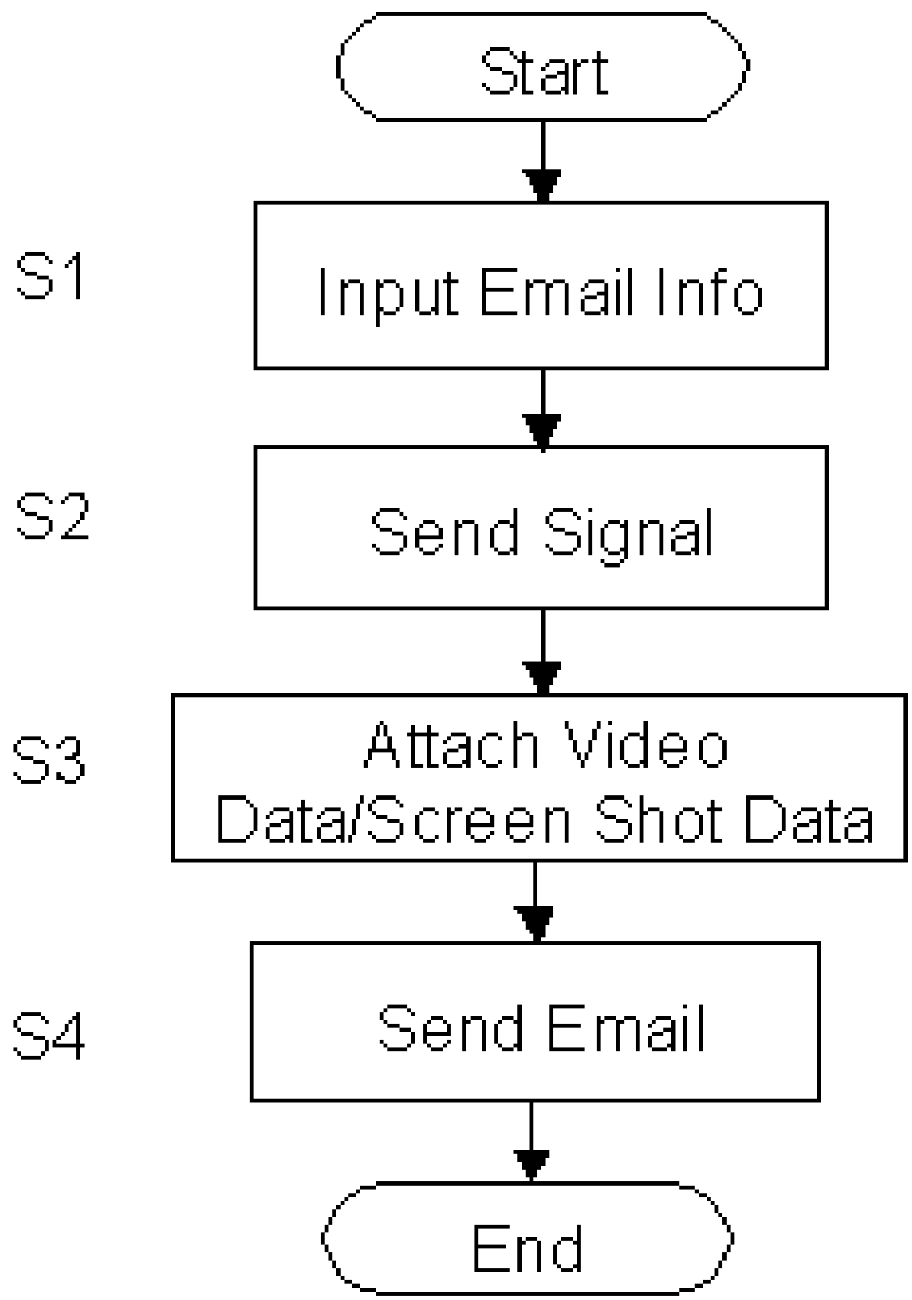

FIG. 123 is a flowchart illustrating an exemplary embodiment of the present invention.

Figure 124:
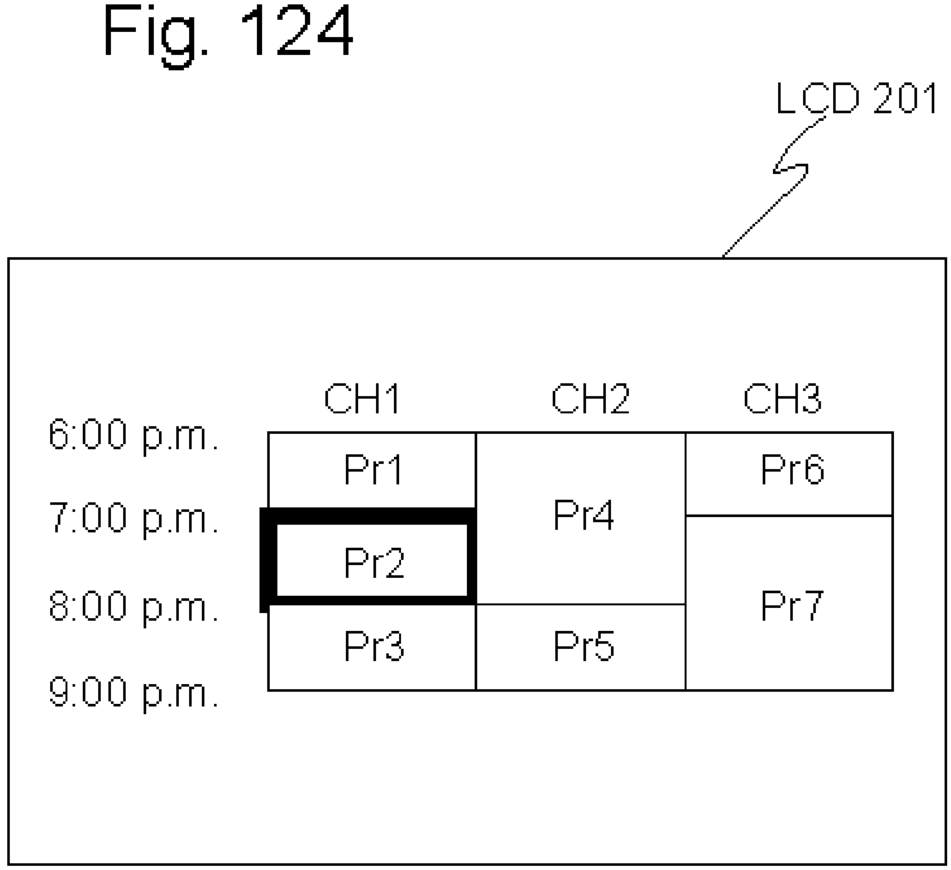

FIG. 124 is a simplified illustration of contents and items shown on display.

Figure 125:
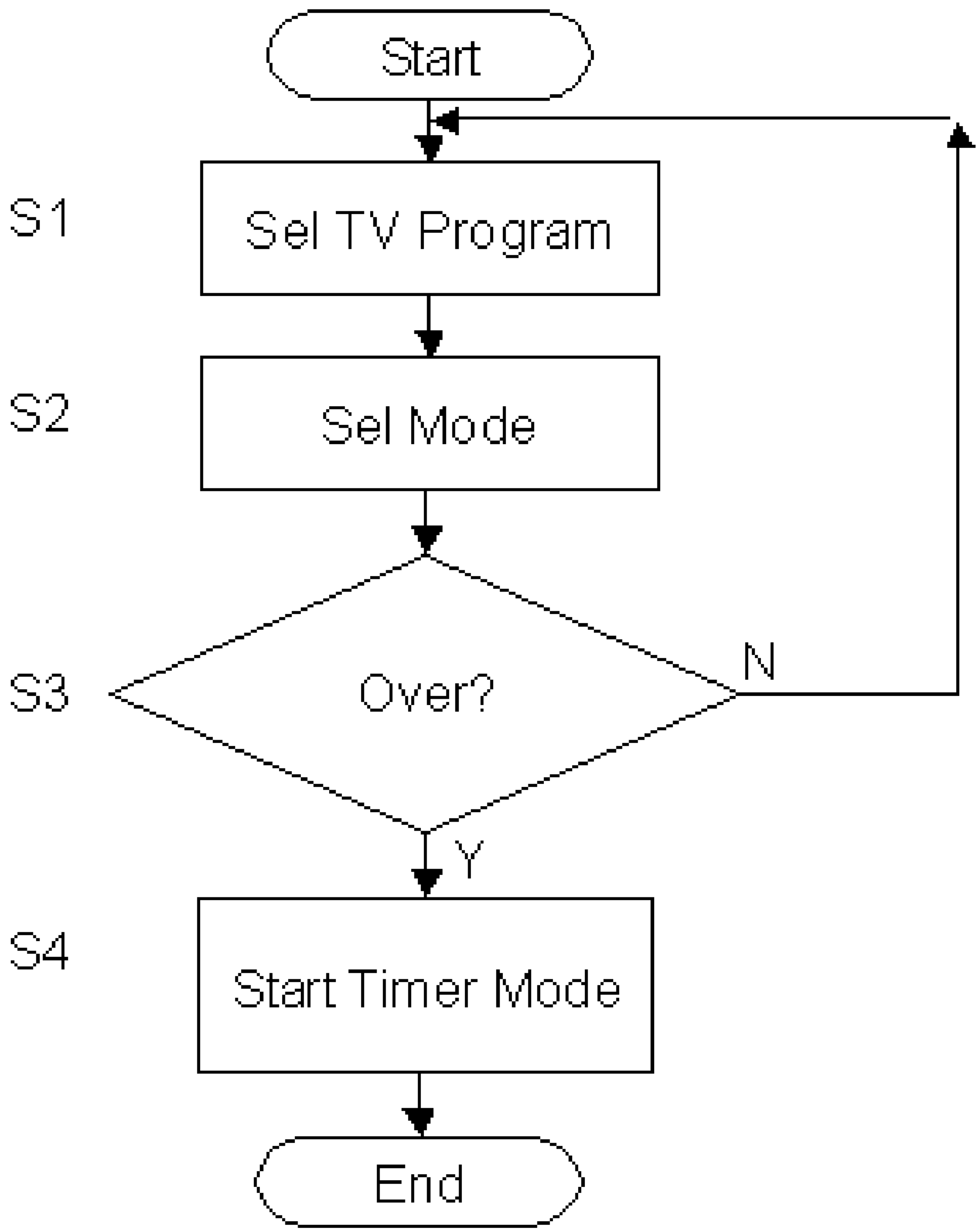

FIG. 125 is a flowchart illustrating an exemplary embodiment of the present invention.

Figure 126:
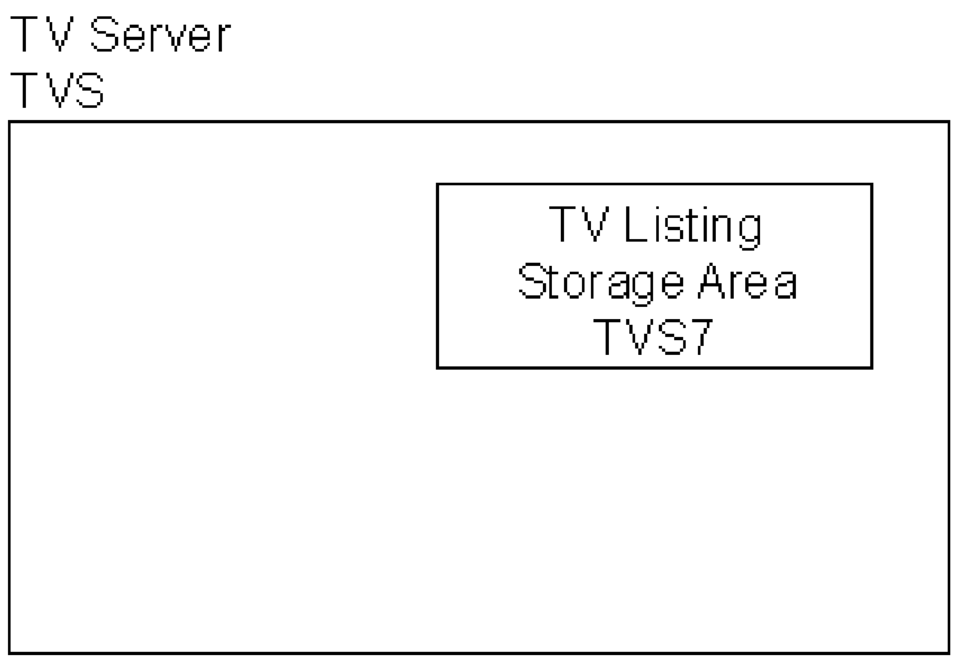

FIG. 126 is a block diagram illustrating an exemplary embodiment of the present invention.

Figure 127:
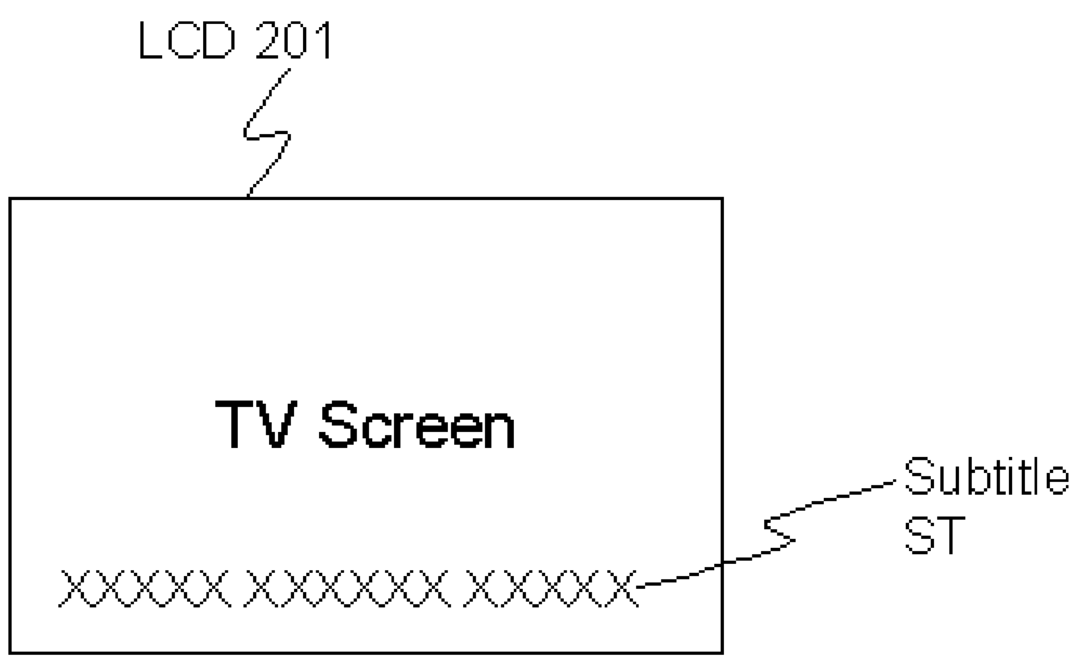

FIG. 127 is a simplified illustration of contents and items shown on display.

Figure 128:
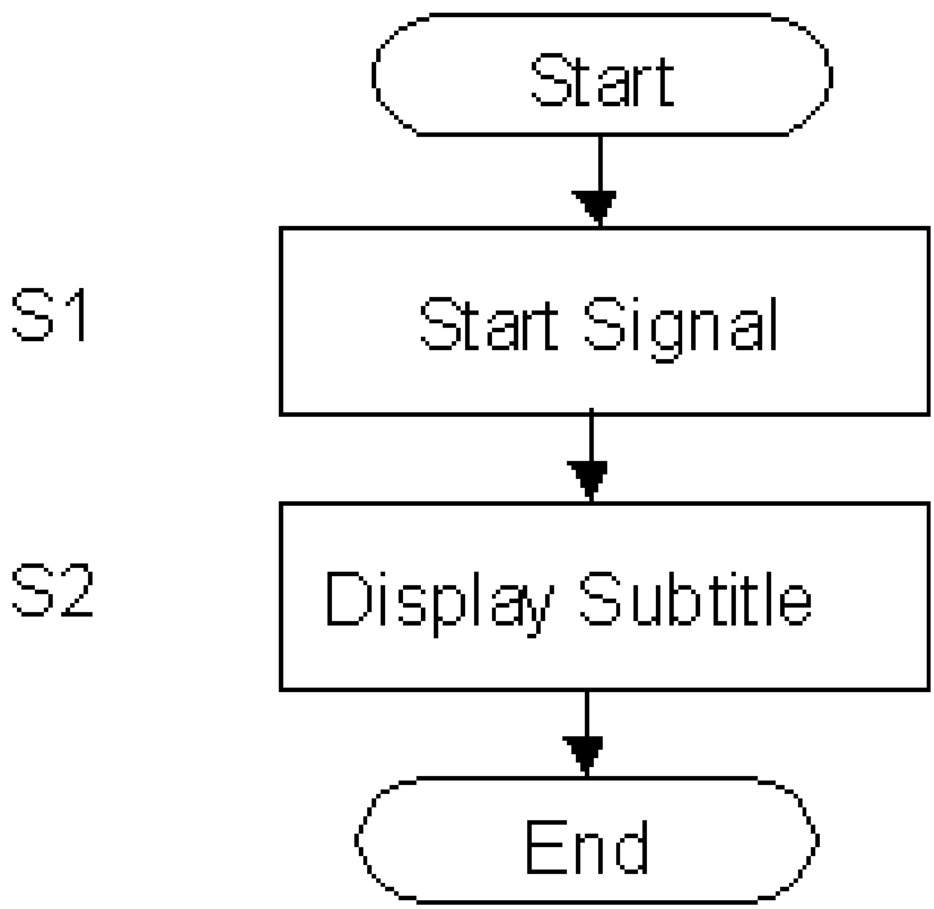

FIG. 128 is a flowchart illustrating an exemplary embodiment of the present invention.

Figure 129:
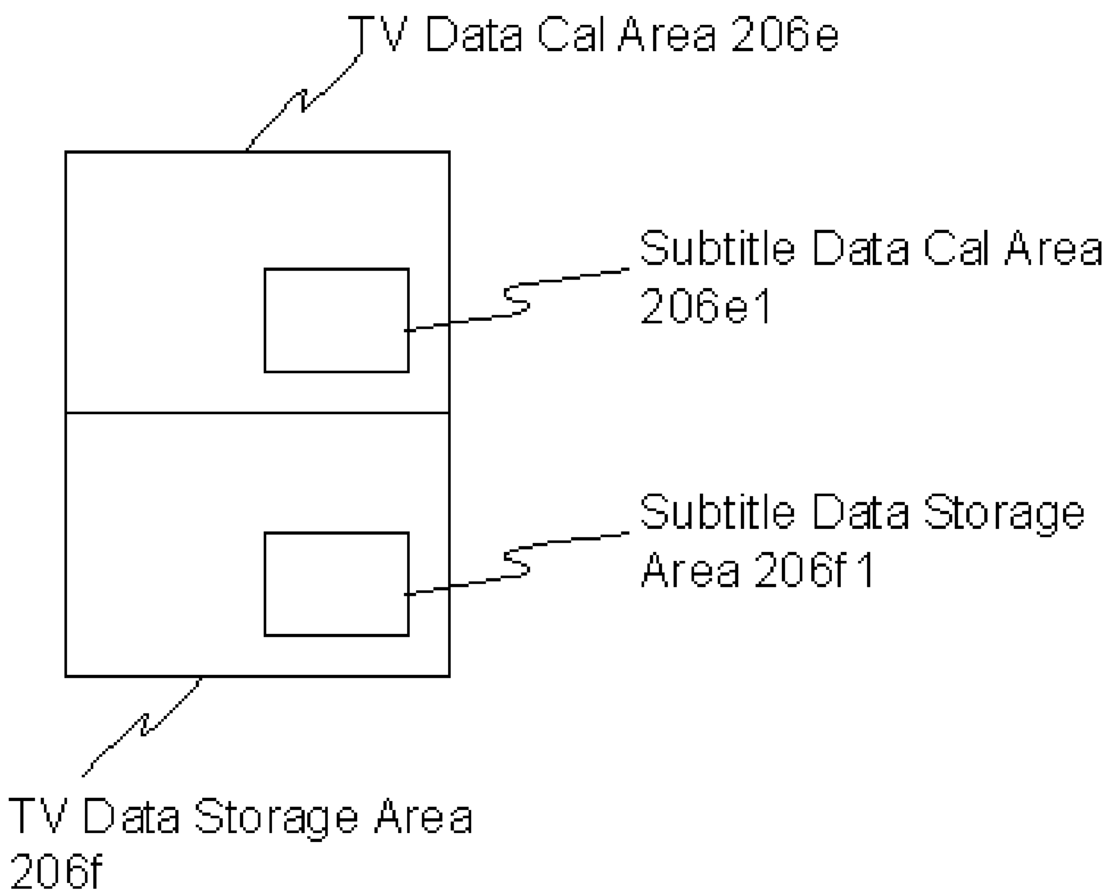

FIG. 129 is a block diagram illustrating an exemplary embodiment of the present invention.

Figure 130:
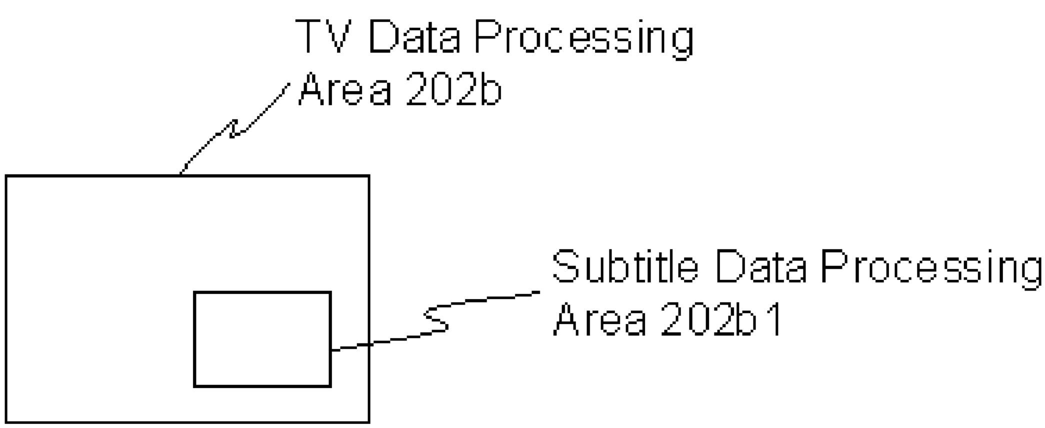

FIG. 130 is a block diagram illustrating an exemplary embodiment of the present invention.

Figure 131A:
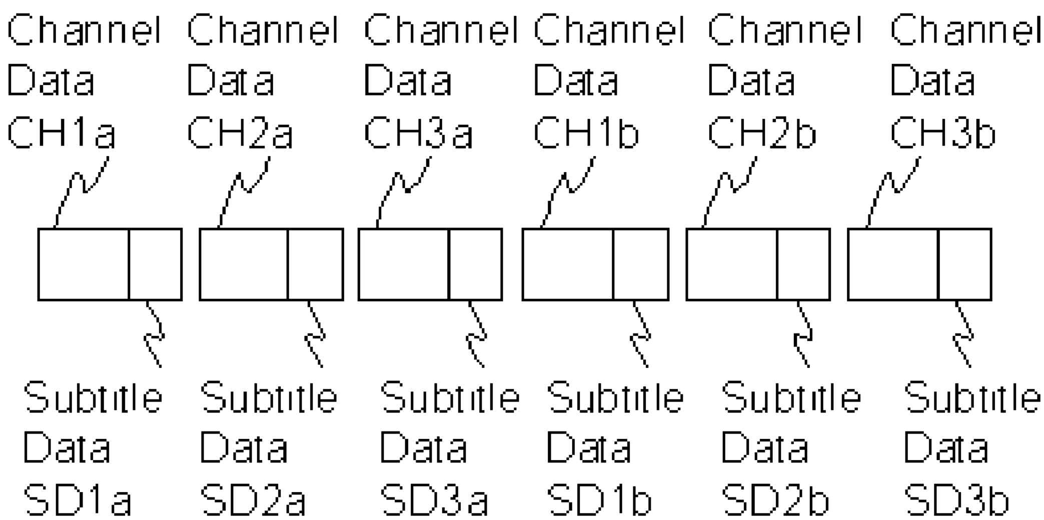

FIG. 131*a* is a simplified illustration of data utilized in the present invention.

Figure 131B:
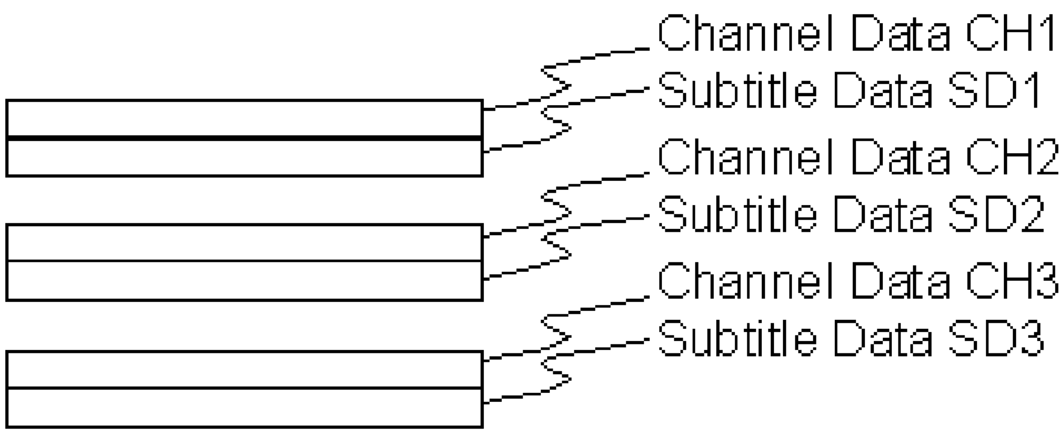

FIG. 131*b* is a simplified illustration of data utilized in the present invention.

Figure 132:
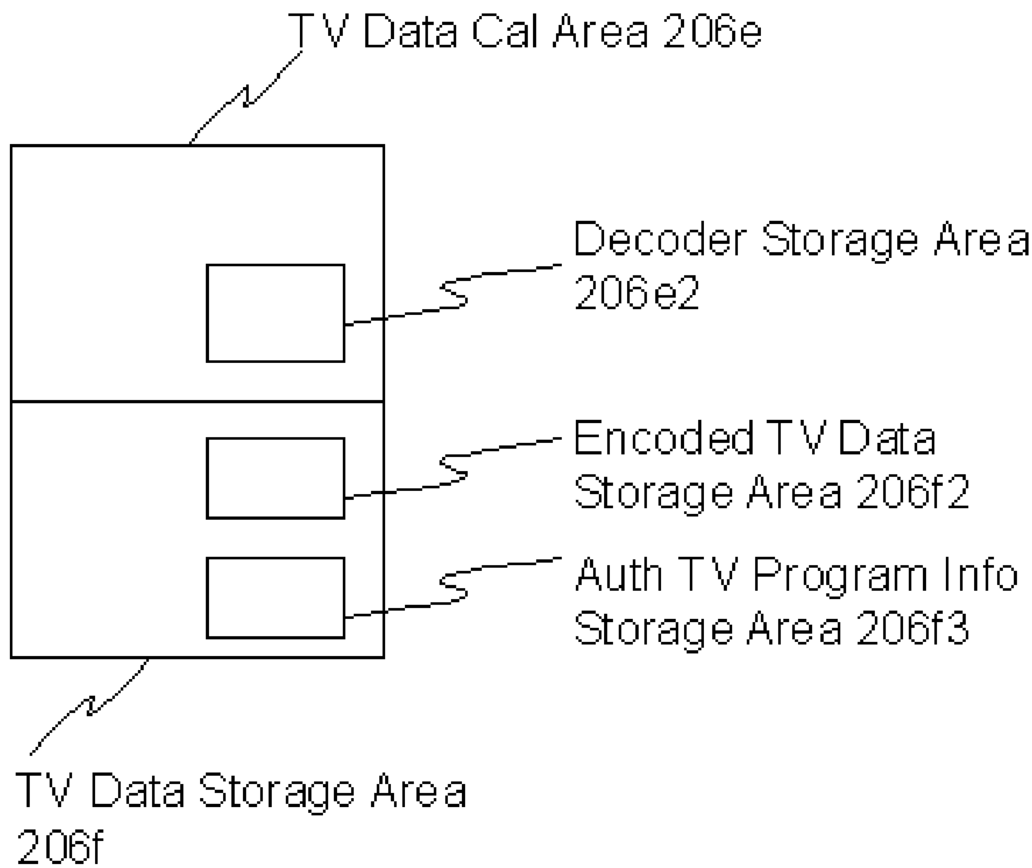

FIG. 132 is a block diagram illustrating an exemplary embodiment of the present invention.

Figure 133:
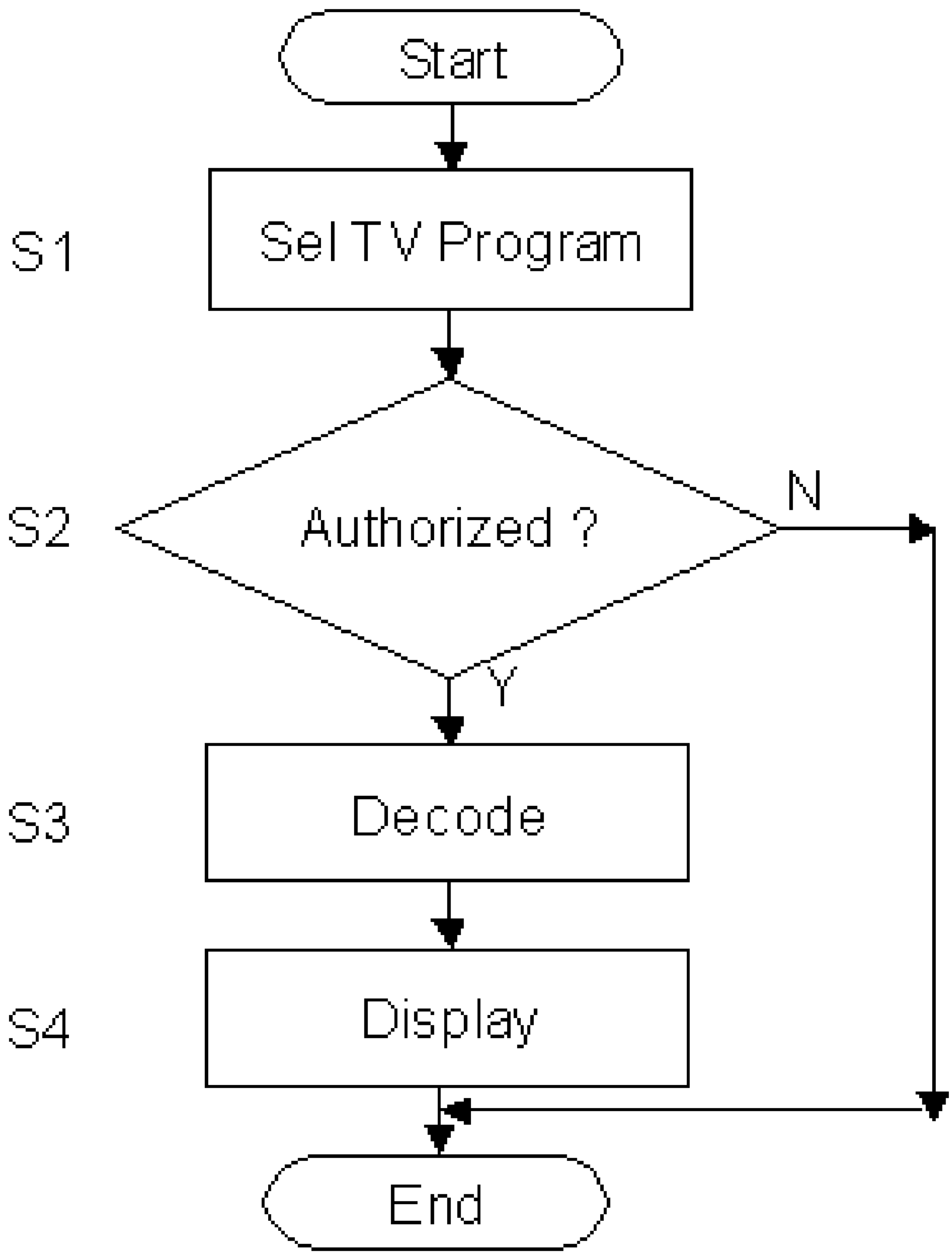

FIG. 133 is a flowchart illustrating an exemplary embodiment of the present invention.

Figure 134:
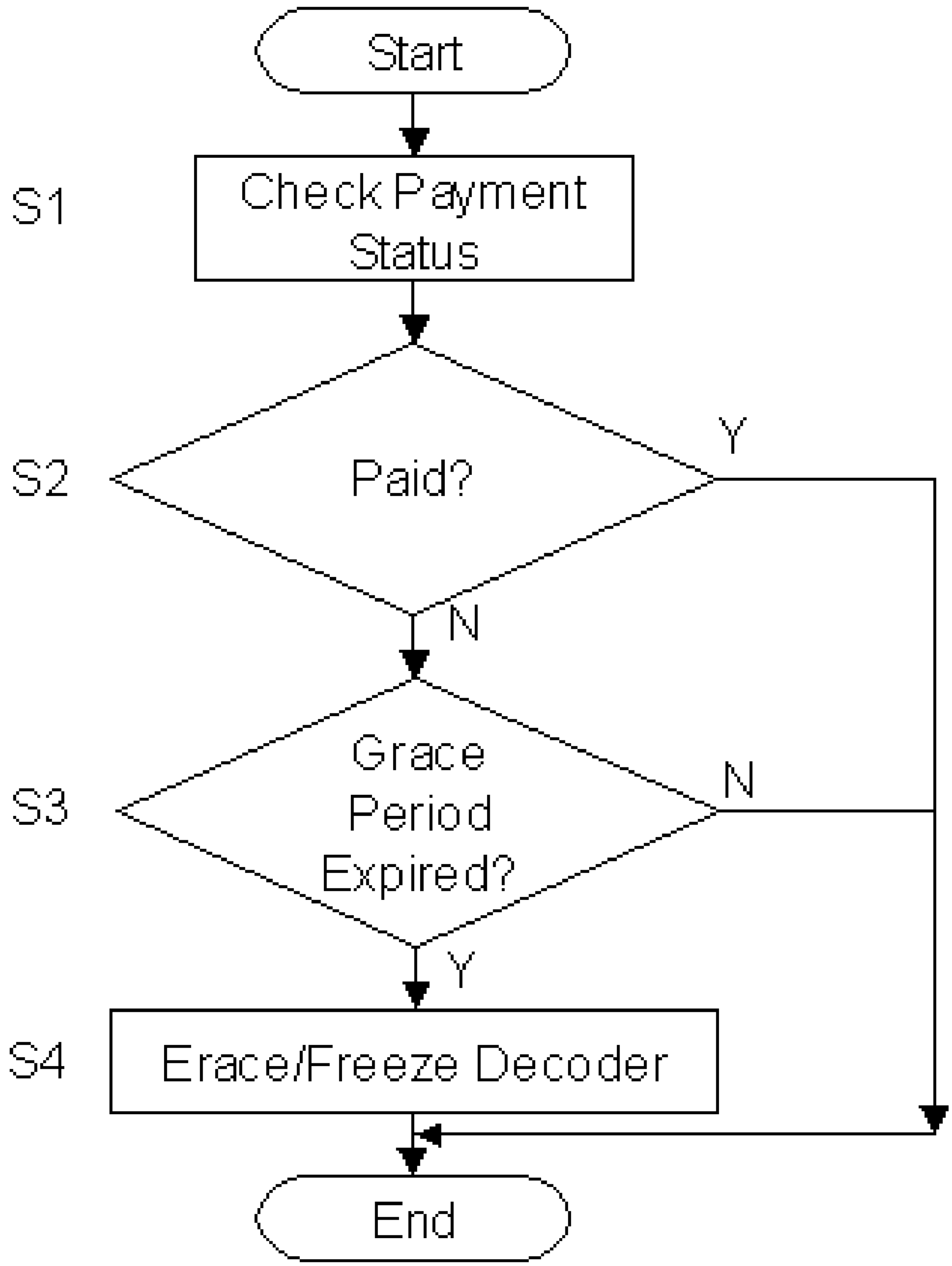

FIG. 134 is a flowchart illustrating an exemplary embodiment of the present invention.

Figure 135:
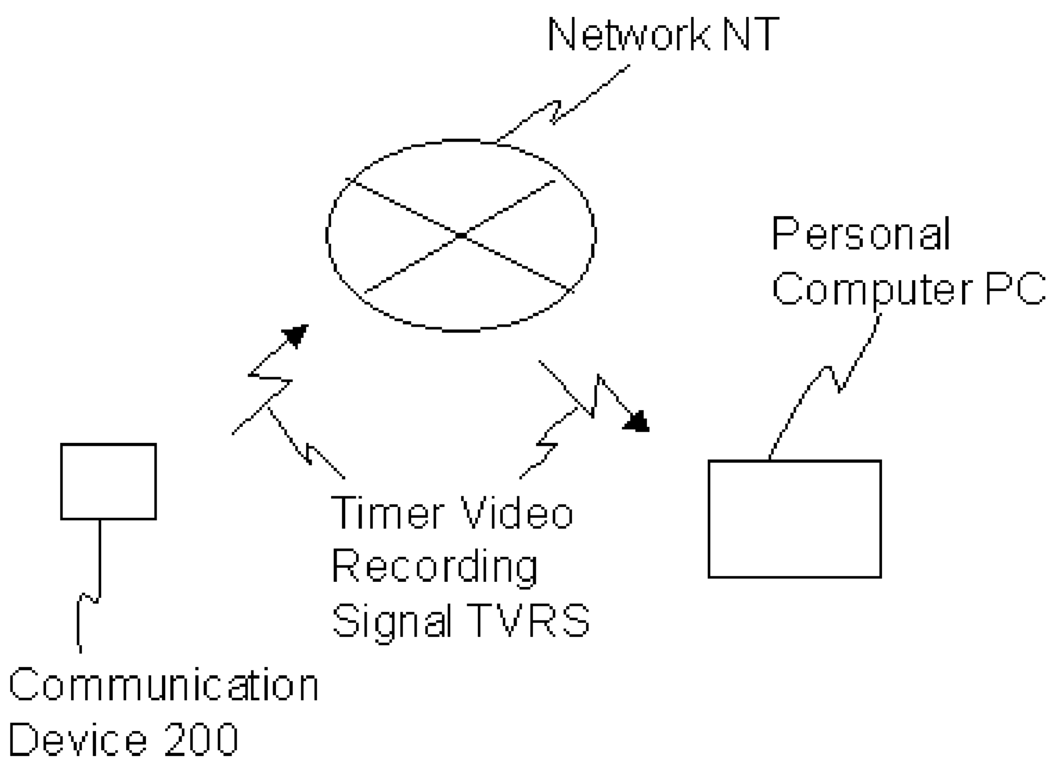

FIG. 135 is a simplified illustration illustrating an exemplary embodiment of the present invention.

Figure 136:
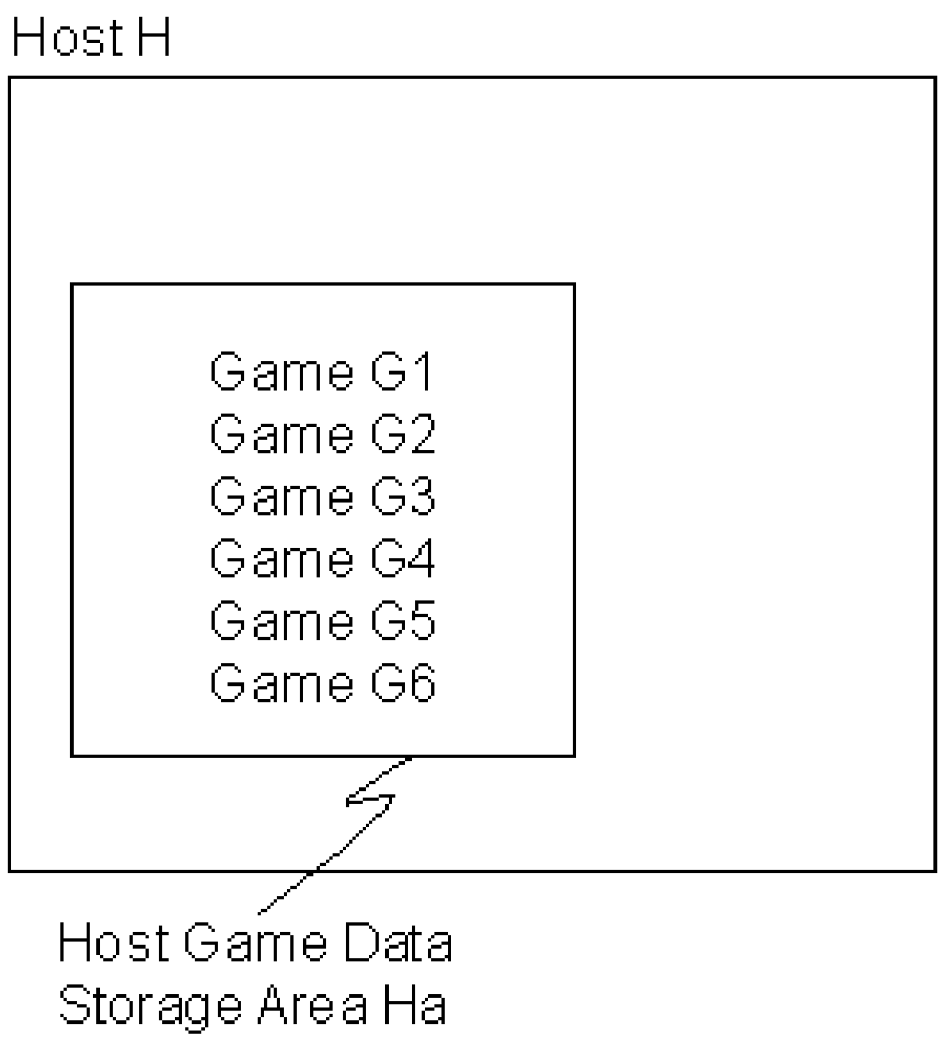

FIG. 136 is a block diagram illustrating an exemplary embodiment of the present invention.

Figure 137:
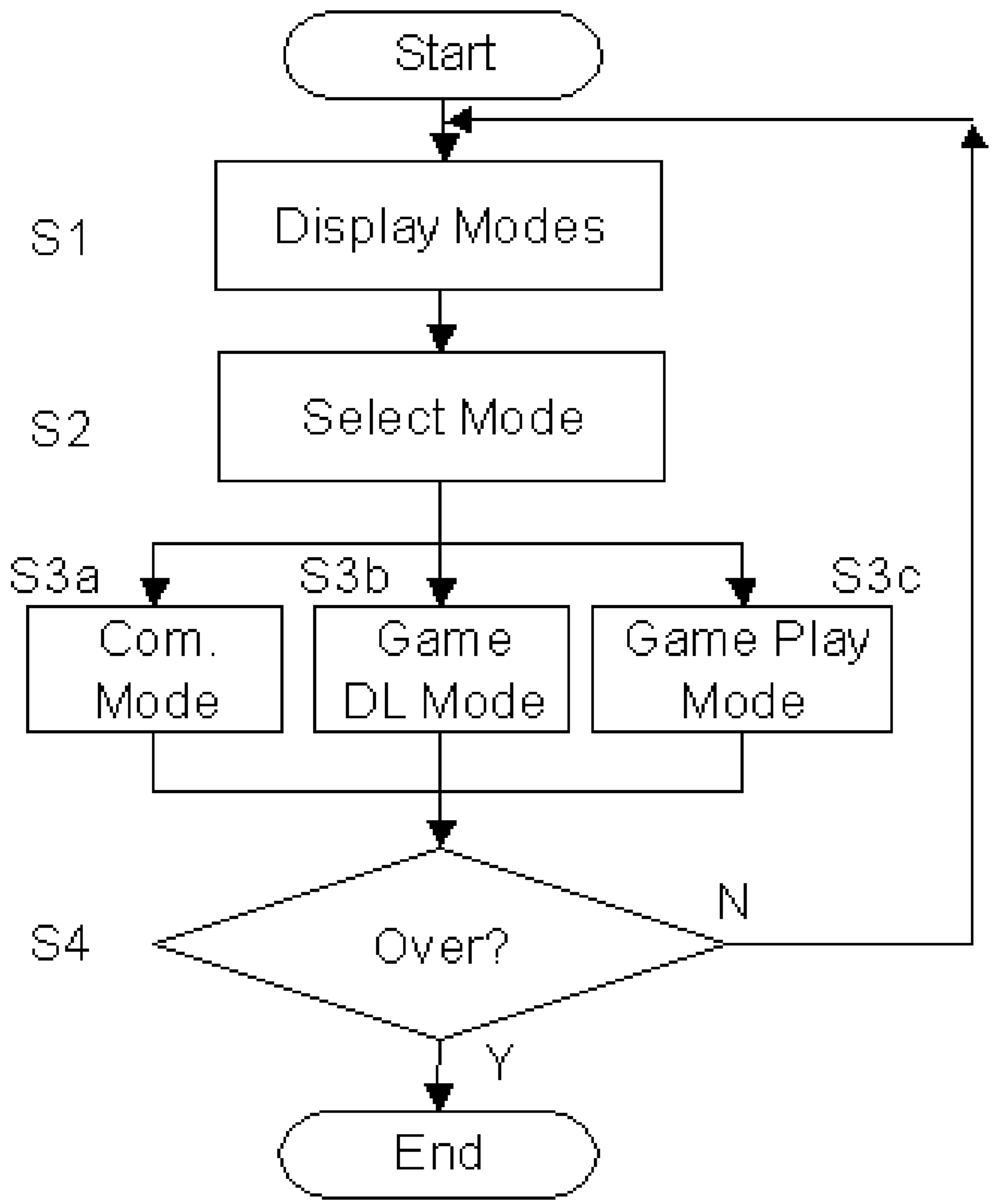

FIG. 137 is a flowchart illustrating an exemplary embodiment of the present invention.

Figure 138:
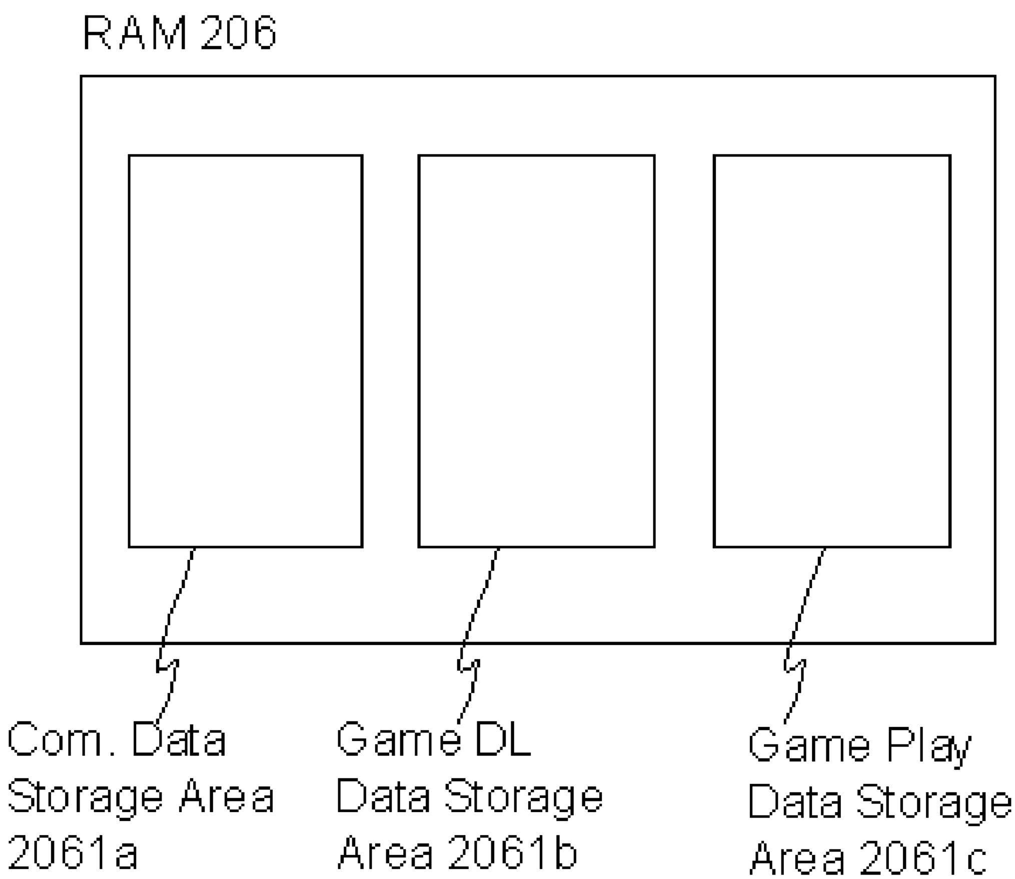

FIG. 138 is a block diagram illustrating an exemplary embodiment of the present invention.

Figure 139:
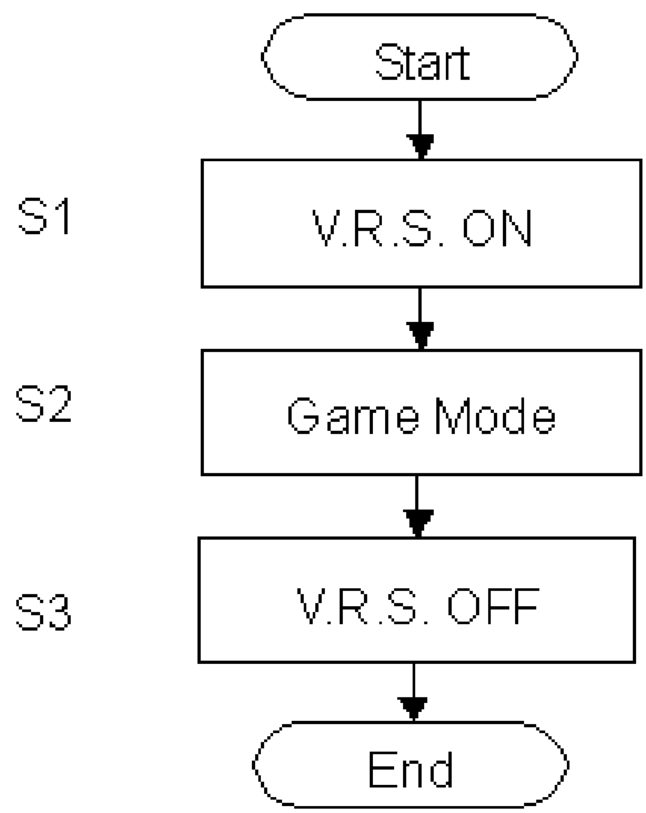

FIG. 139 is a flowchart illustrating an exemplary embodiment of the present invention.

Figure 140:
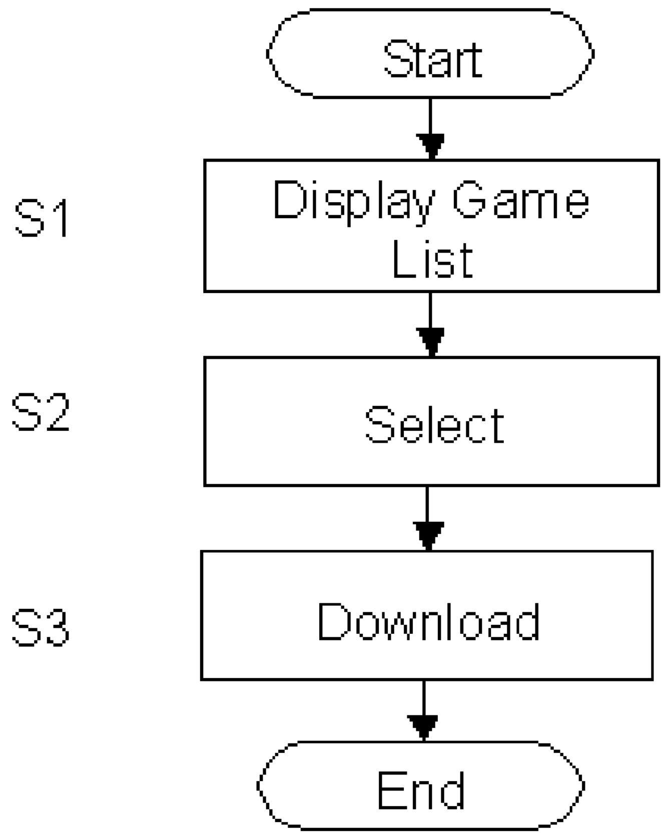

FIG. 140 is a flowchart illustrating an exemplary embodiment of the present invention.

Figure 141:
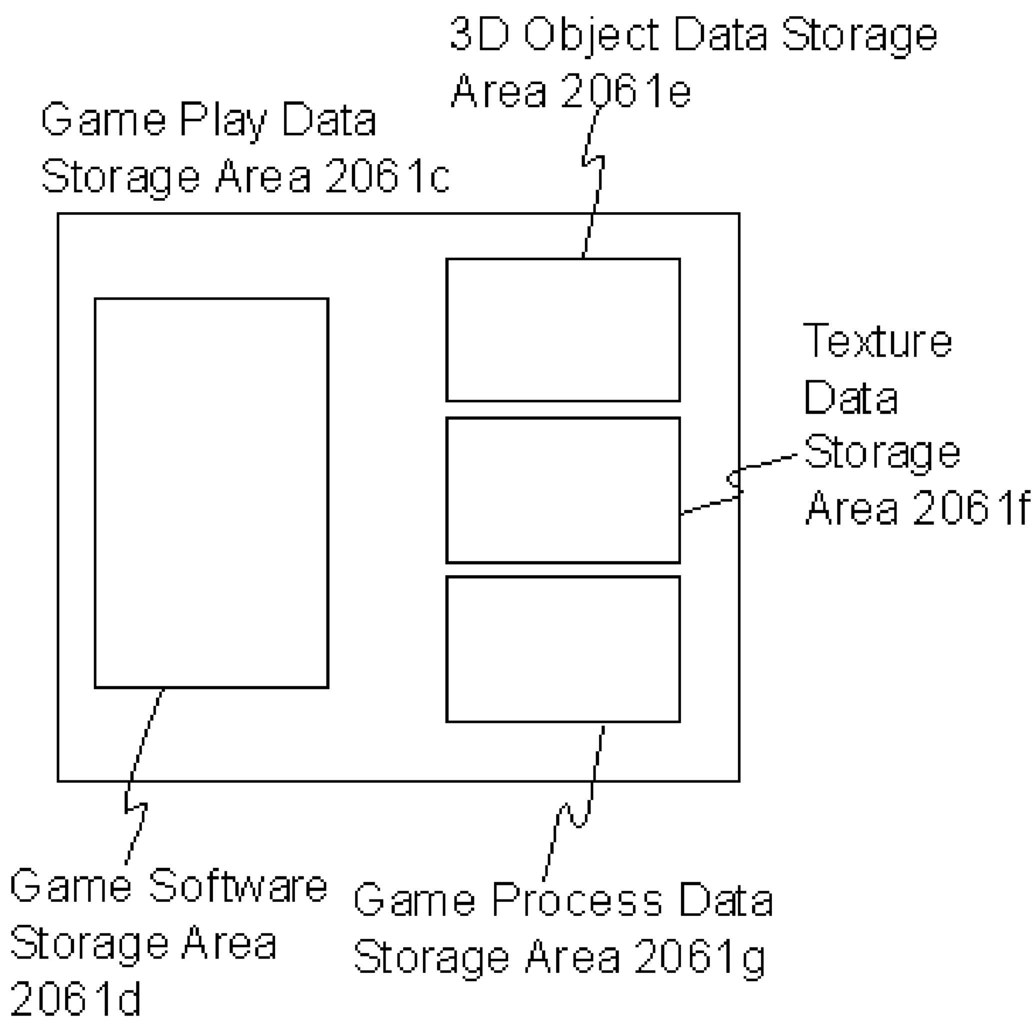

FIG. 141 is a block diagram illustrating an exemplary embodiment of the present invention.

Figure 142:
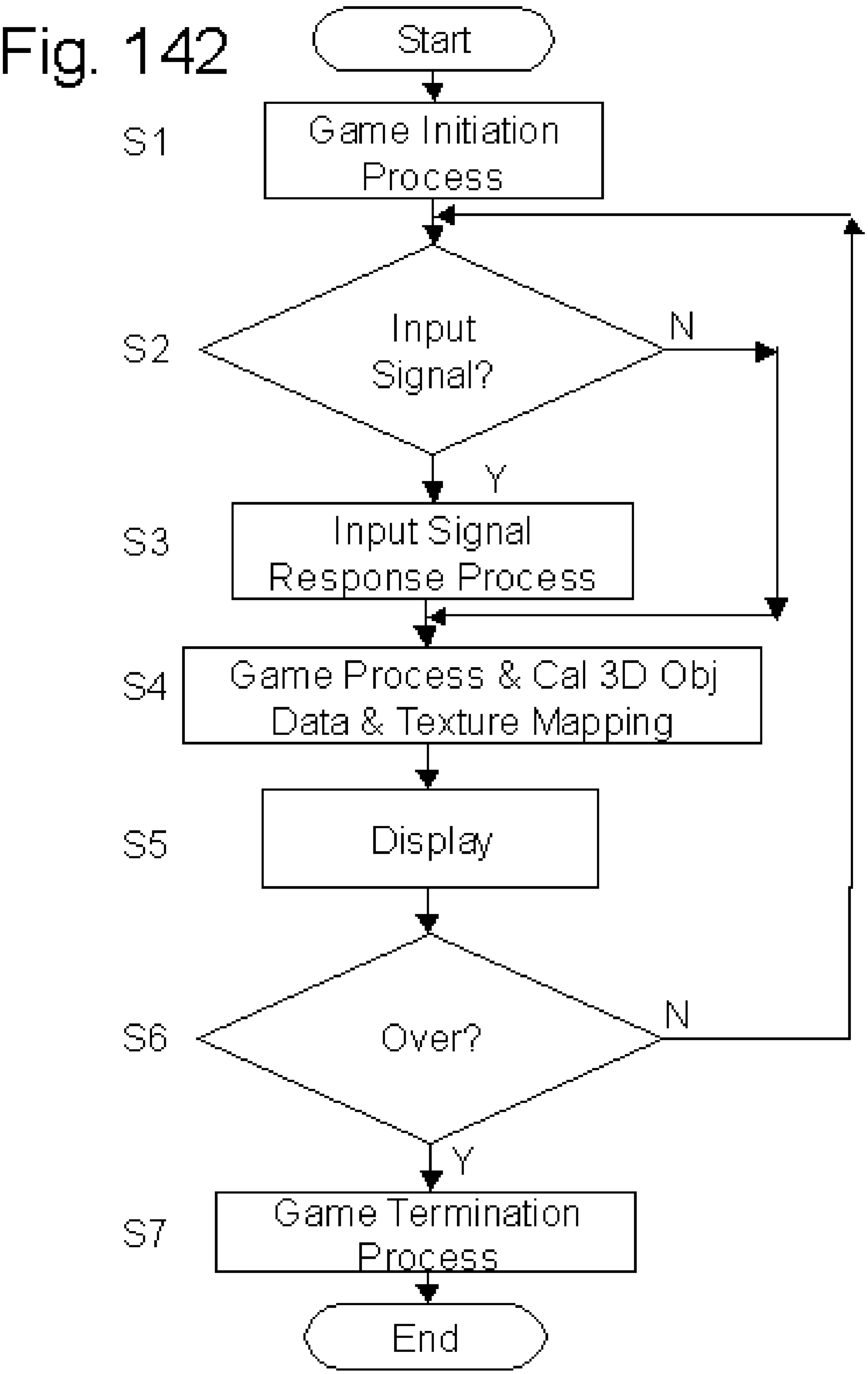

FIG. 142 is a flowchart illustrating an exemplary embodiment of the present invention.

Figure 143:
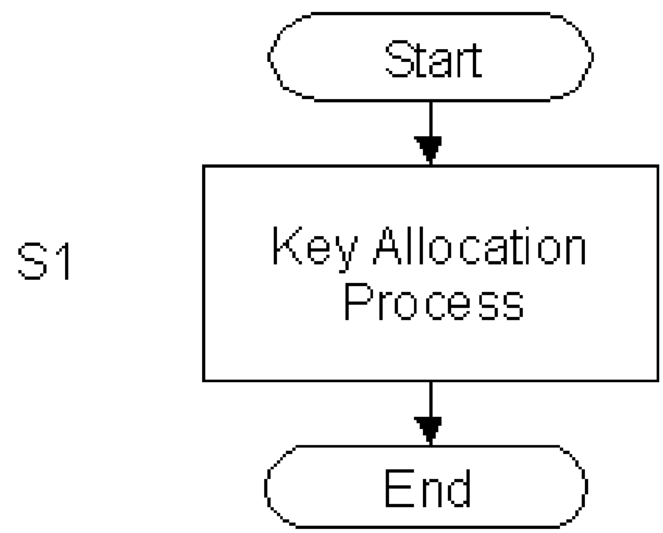

FIG. 143 is a flowchart illustrating an exemplary embodiment of the present invention.

Figure 144:
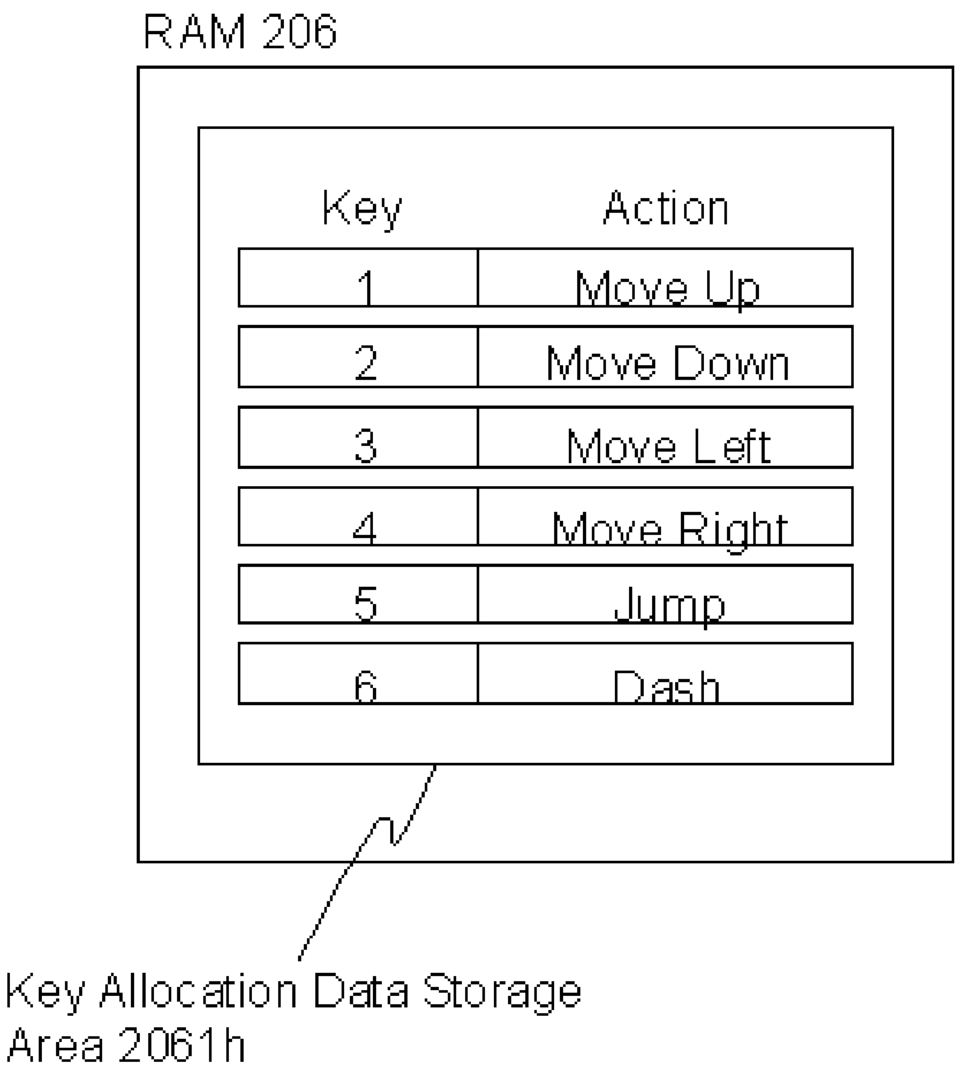

FIG. 144 is a block diagram illustrating an exemplary embodiment of the present invention.

Figure 145:
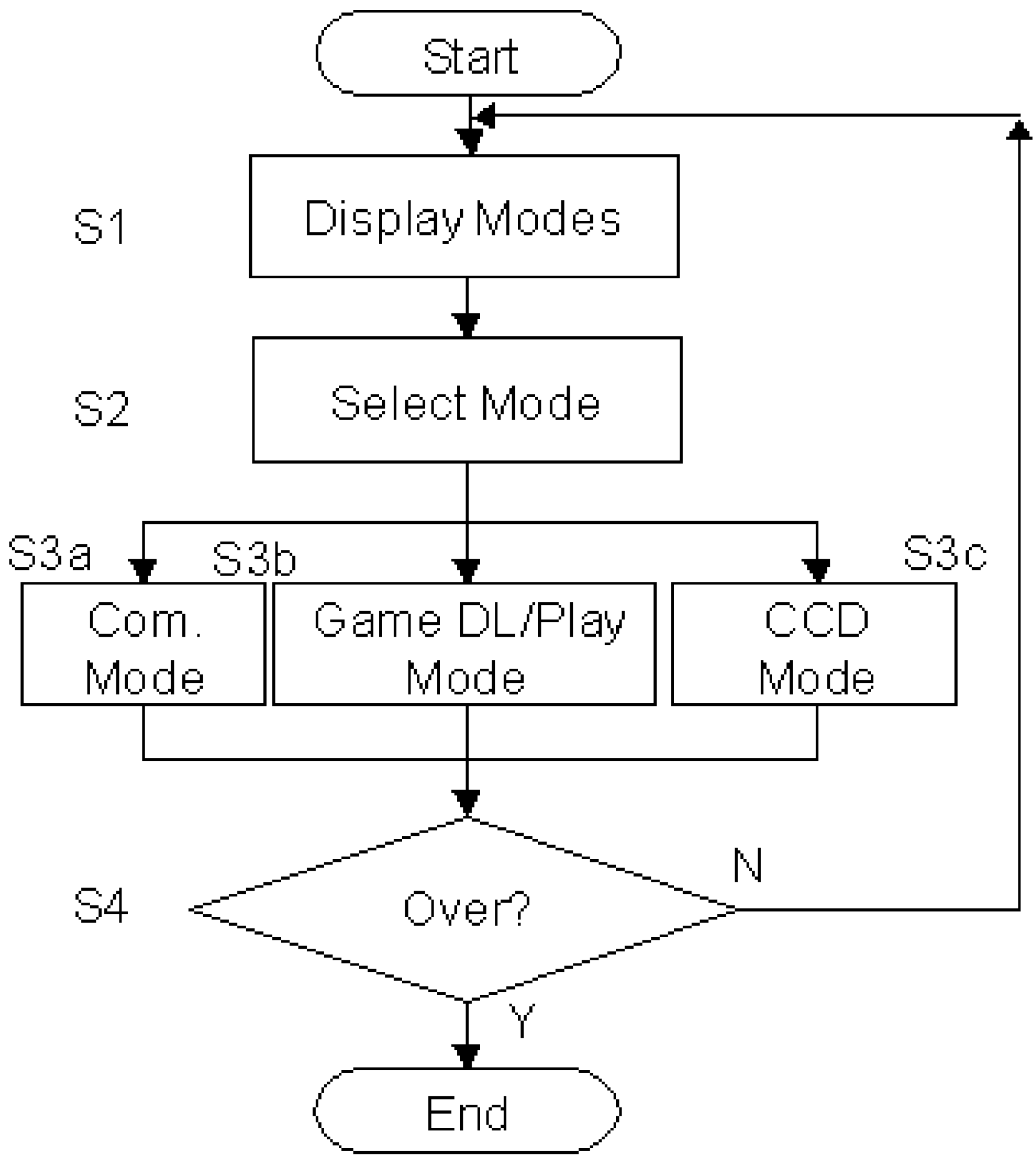

FIG. 145 is a flowchart illustrating an exemplary embodiment of the present invention.

Figure 146:
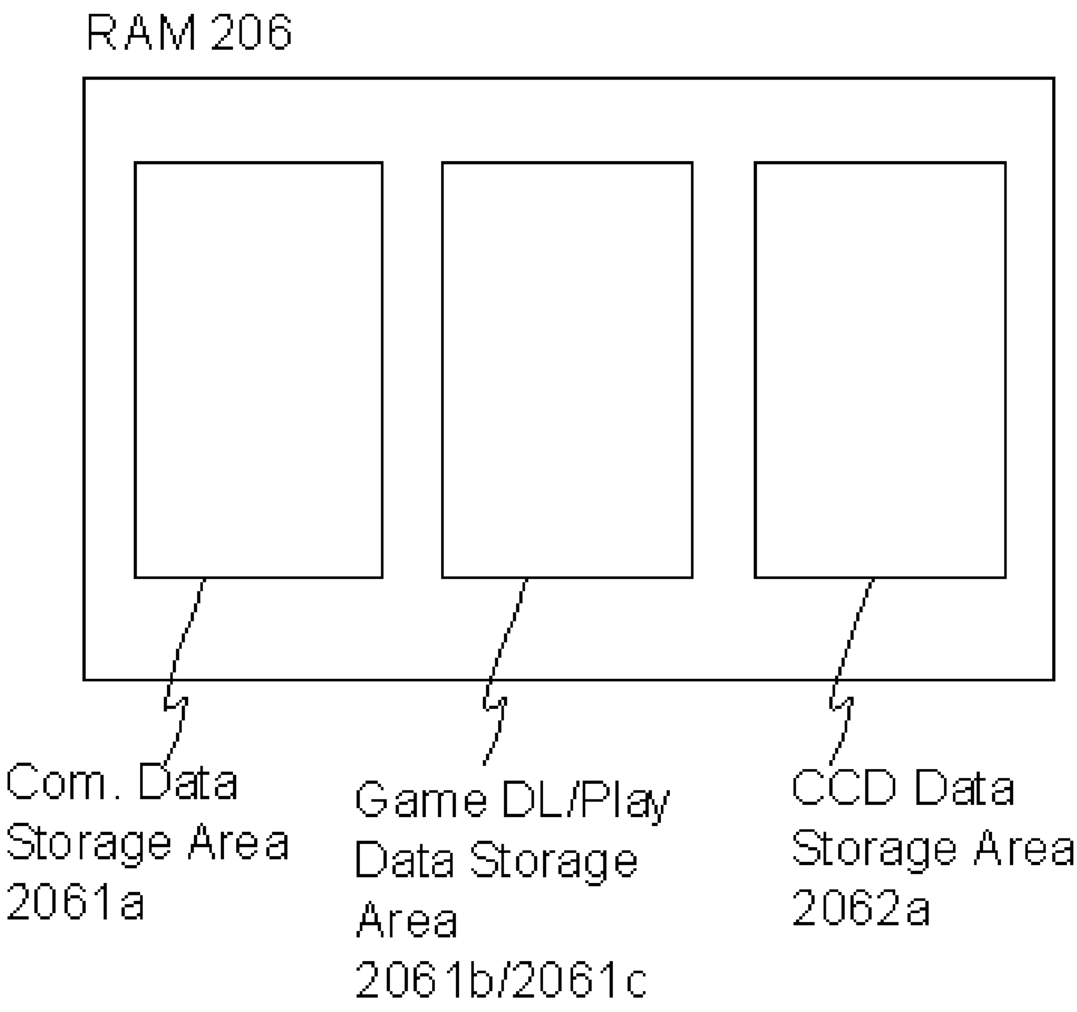

FIG. 146 is a block diagram illustrating an exemplary embodiment of the present invention.

Figure 147:
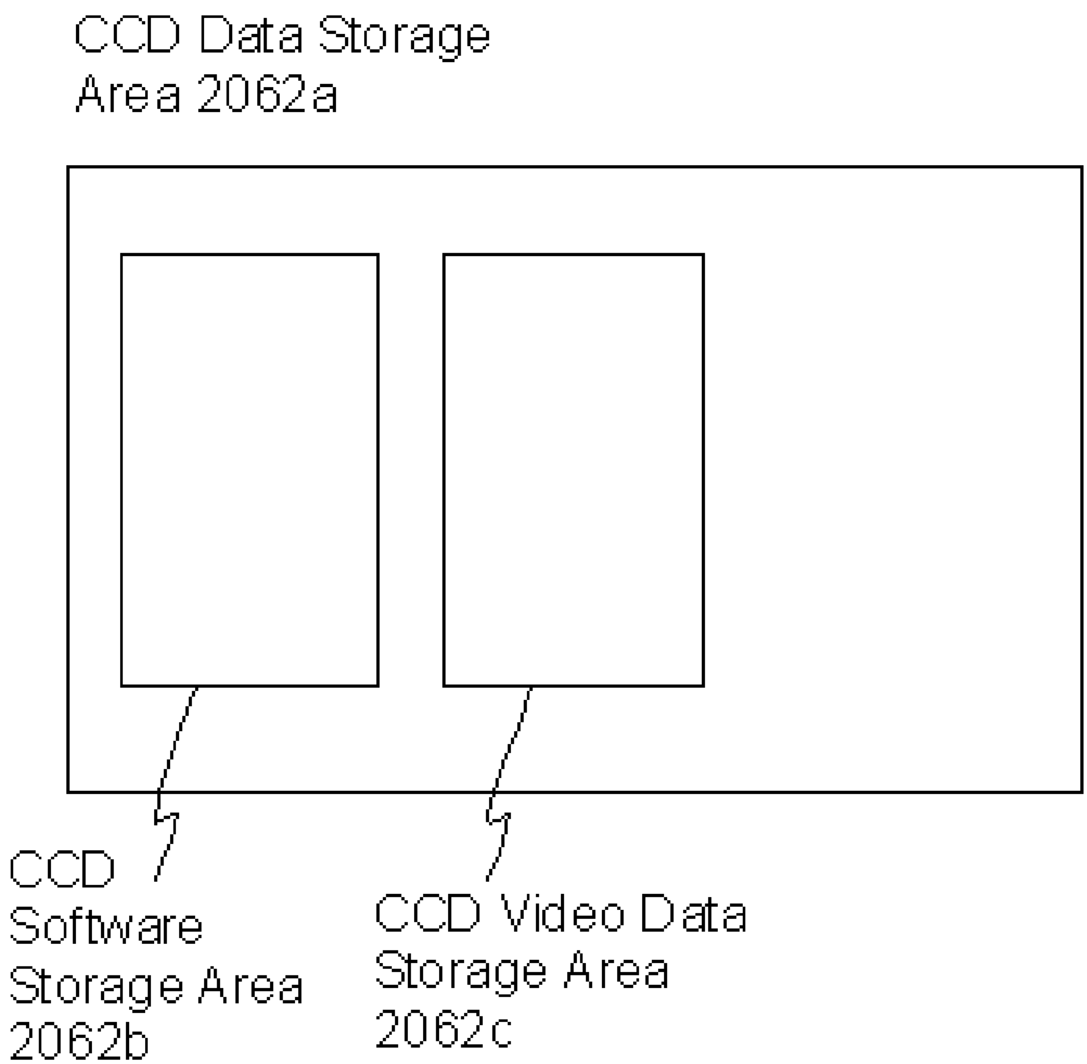

FIG. 147 is a block diagram illustrating an exemplary embodiment of the present invention.

Figure 148:
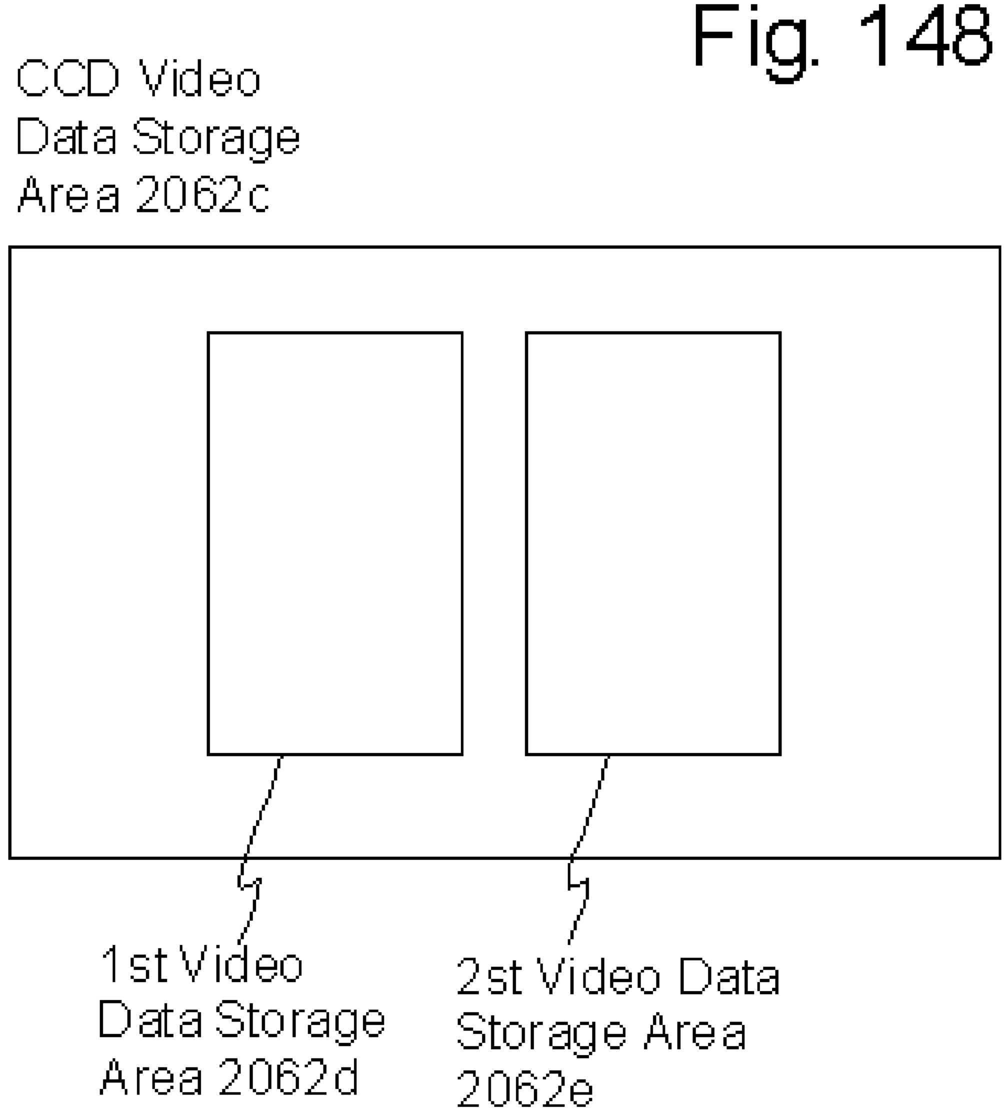

FIG. 148 is a block diagram illustrating an exemplary embodiment of the present invention.

Figure 149:
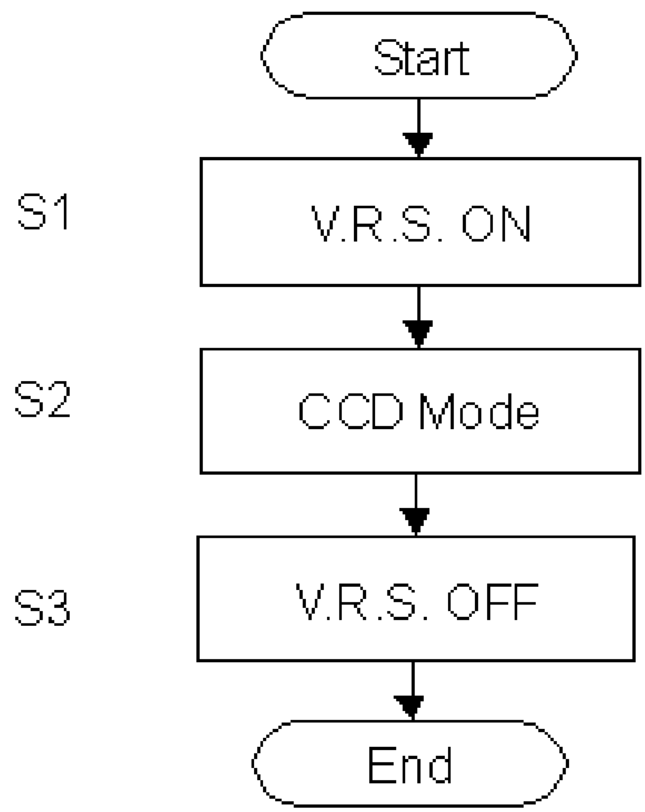

FIG. 149 is a flowchart illustrating an exemplary embodiment of the present invention.

Figure 150:
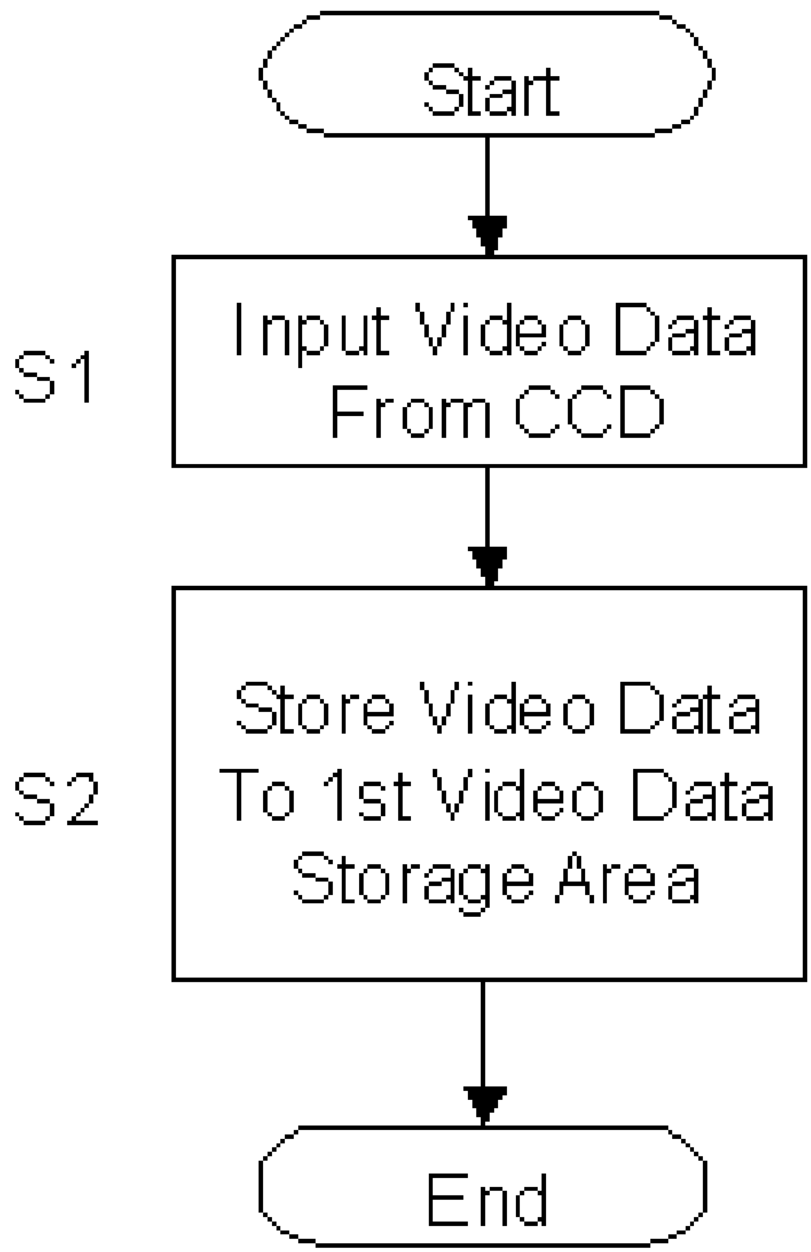

FIG. 150 is a flowchart illustrating an exemplary embodiment of the present invention.

Figure 151:
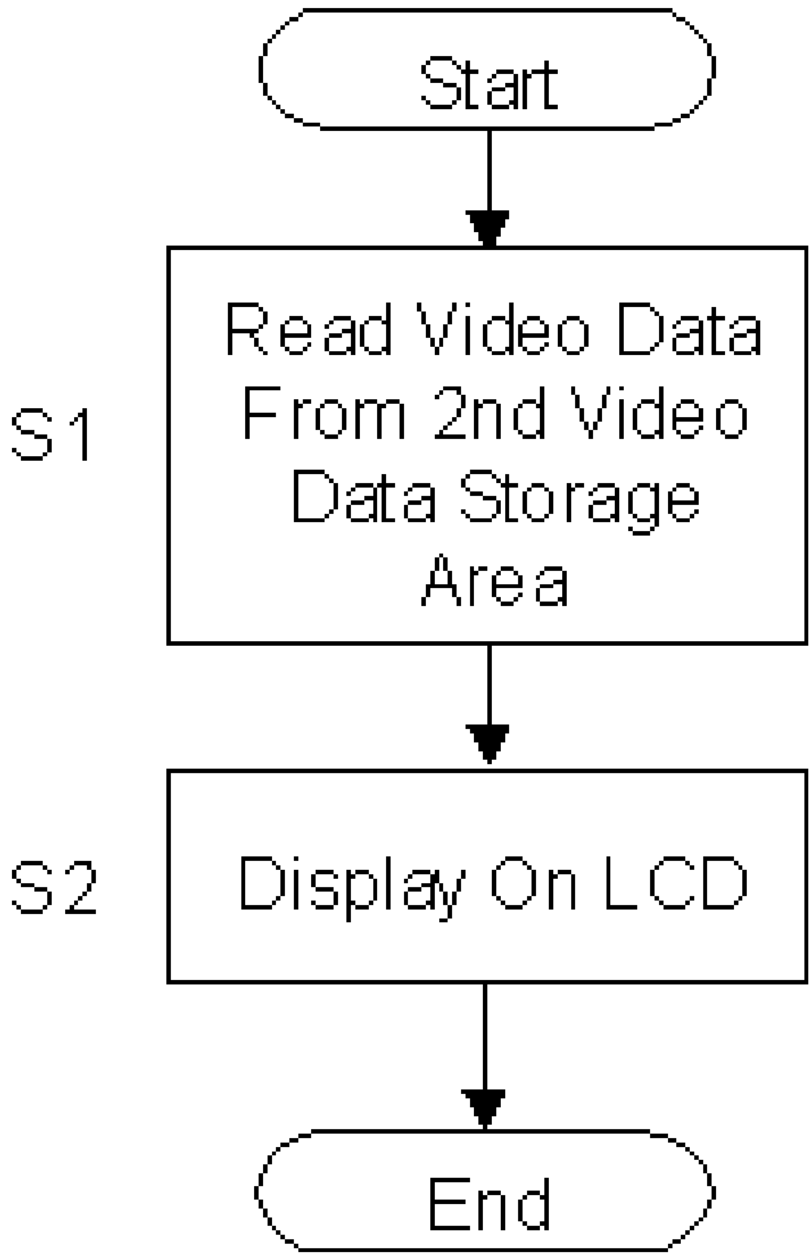

FIG. 151 is a flowchart illustrating an exemplary embodiment of the present invention.

Figure 152:
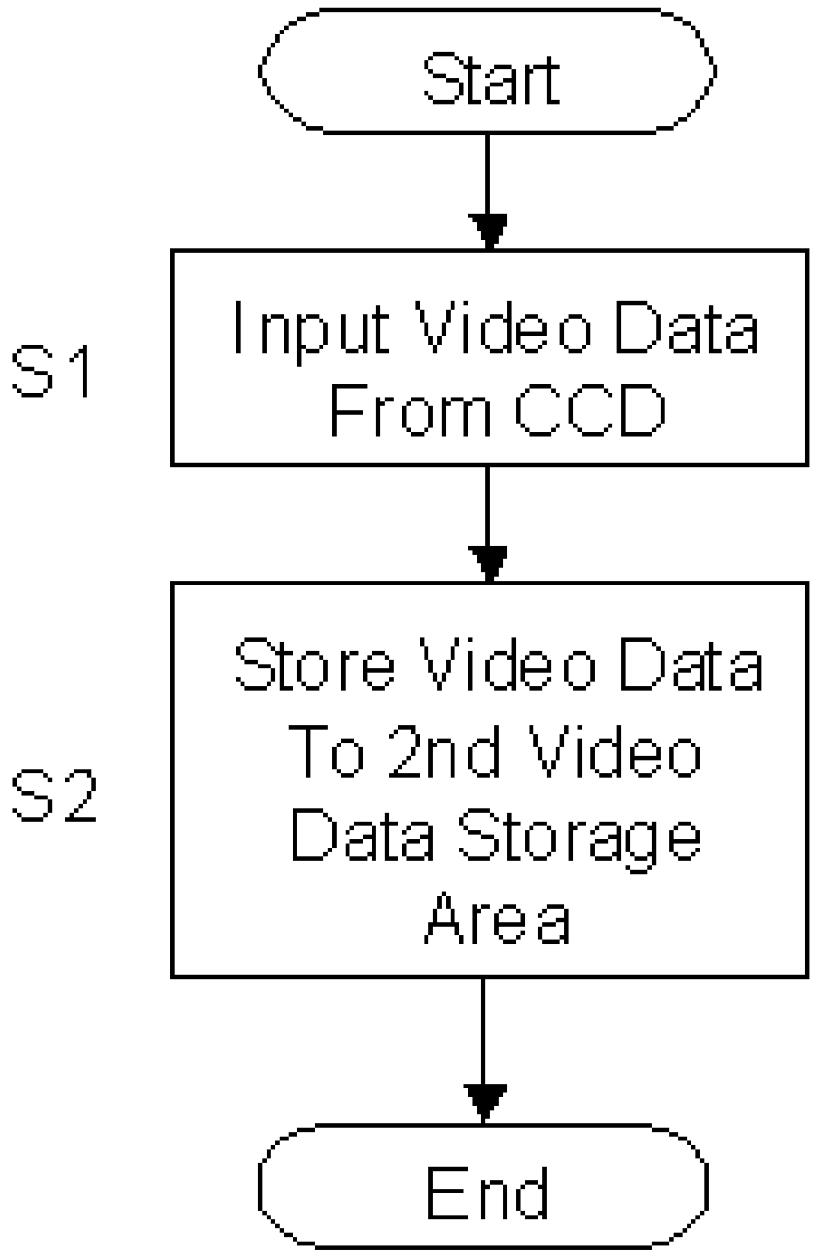

FIG. 152 is a flowchart illustrating an exemplary embodiment of the present invention.

Figure 153:
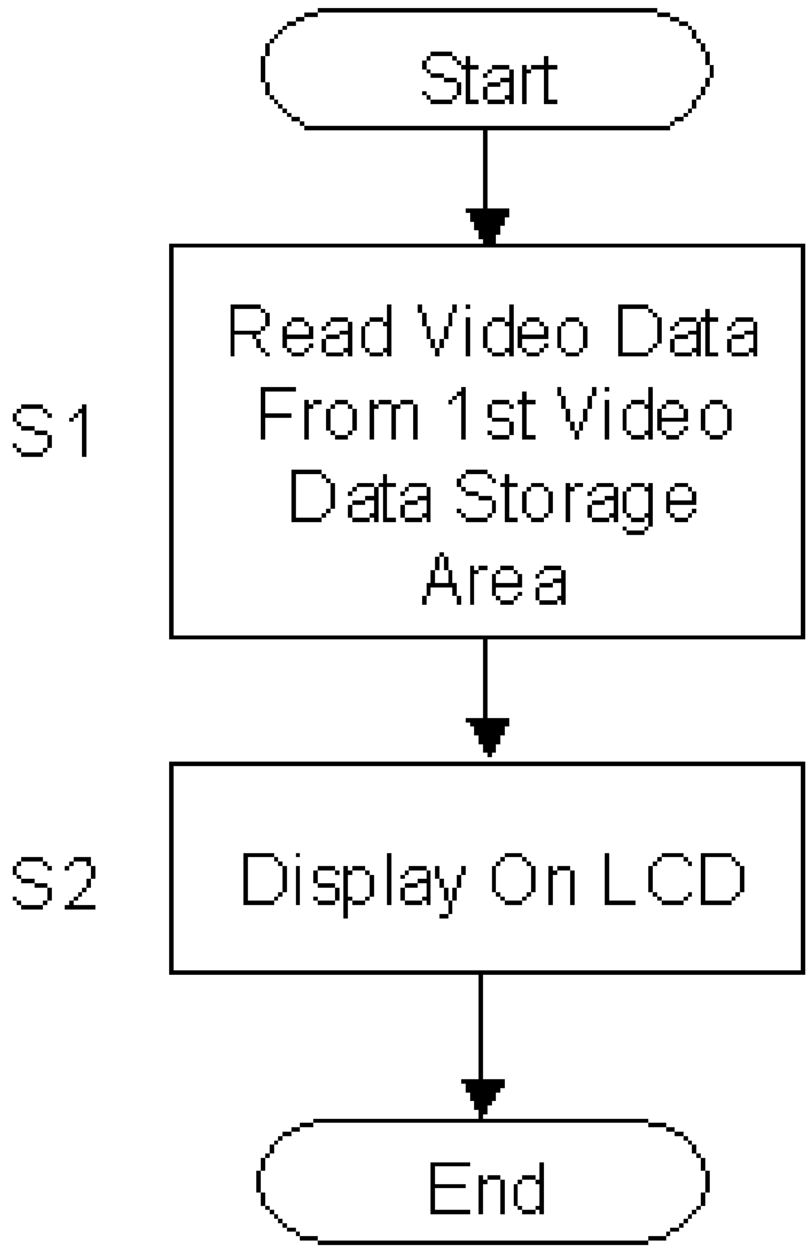

FIG. 153 is a flowchart illustrating an exemplary embodiment of the present invention.

Figure 154:
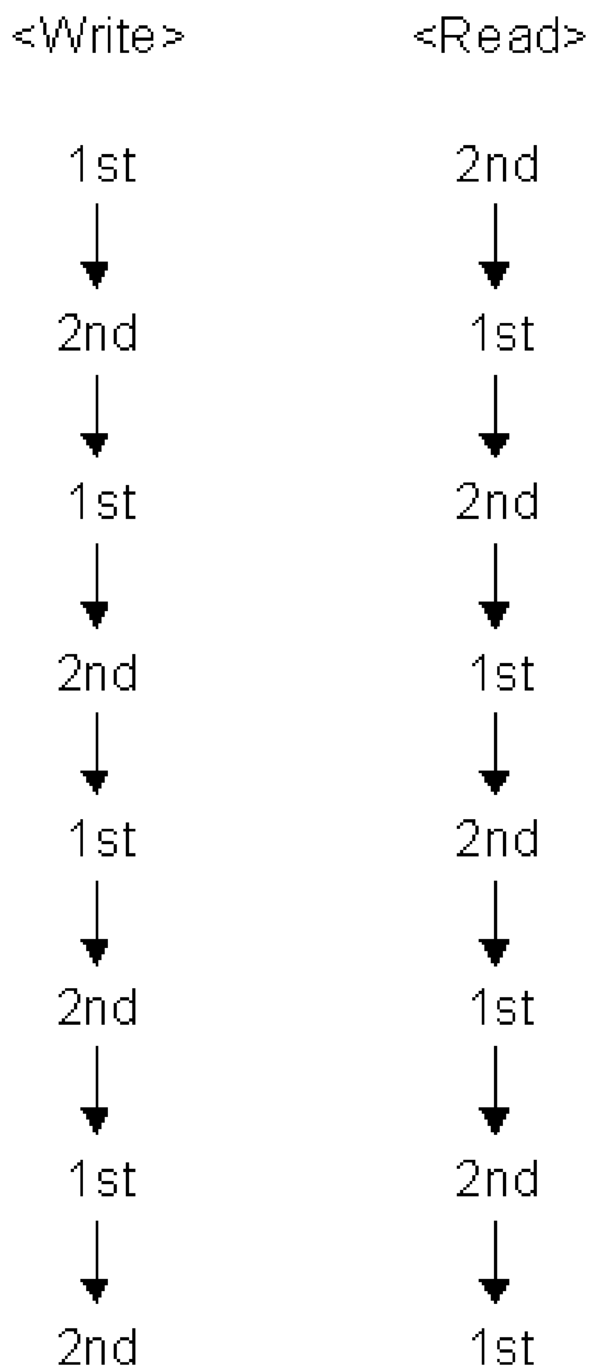

FIG. 154 is a simplified illustration illustrating an exemplary embodiment of the present invention.

Figure 155:
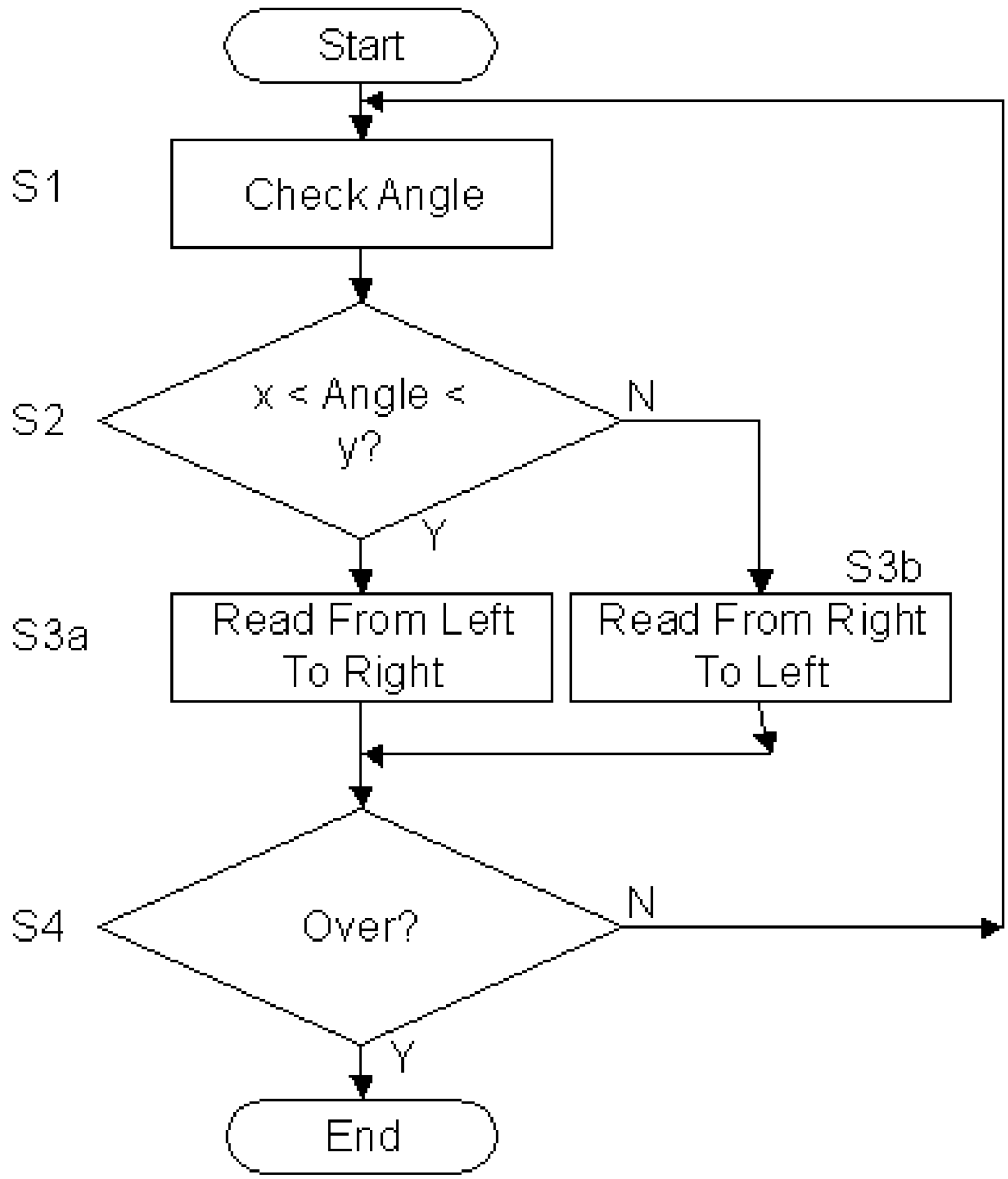

FIG. 155 is a flowchart illustrating an exemplary embodiment of the present invention.

Figure 156:
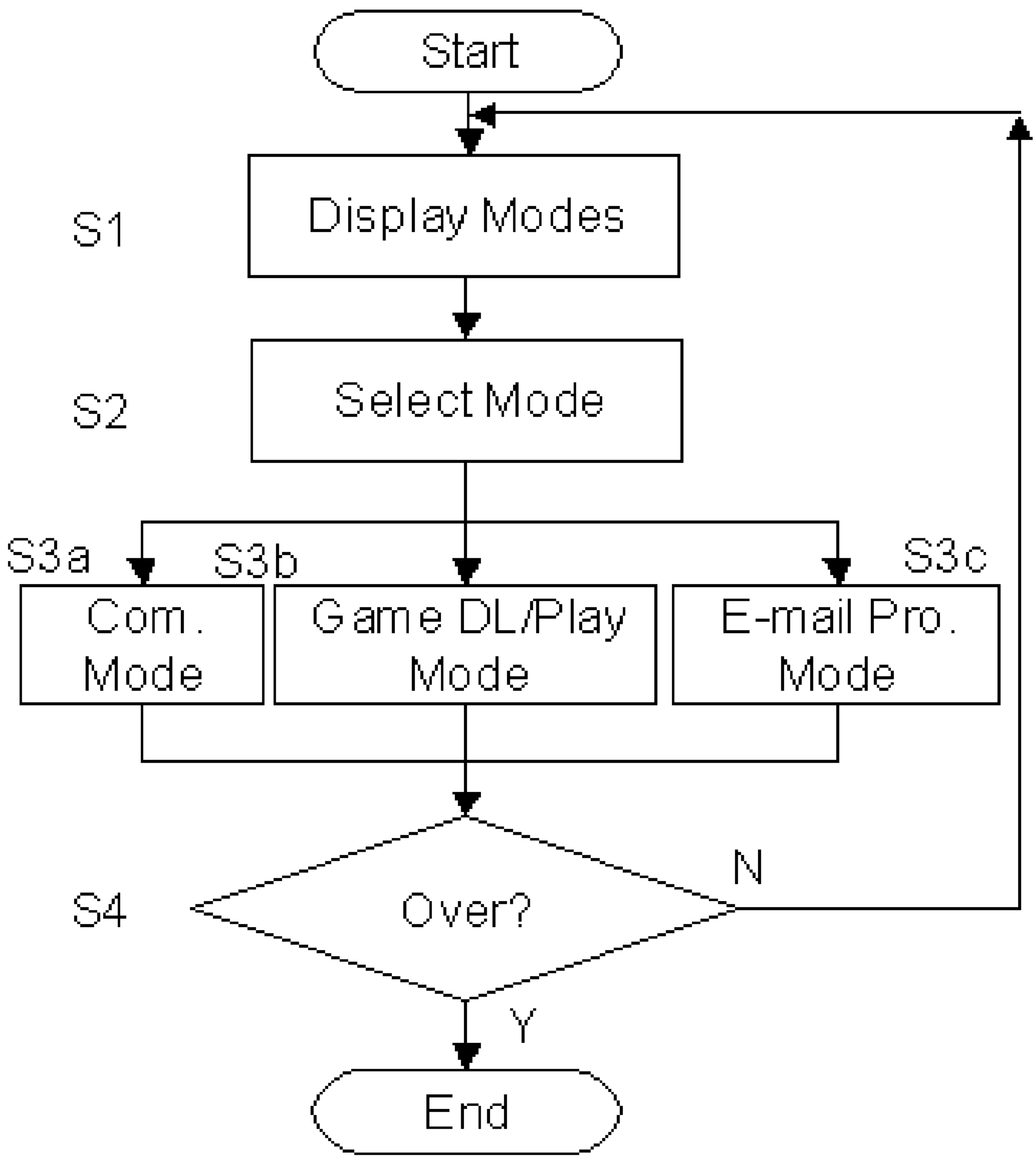

FIG. 156 is a flowchart illustrating an exemplary embodiment of the present invention.

Figure 157:
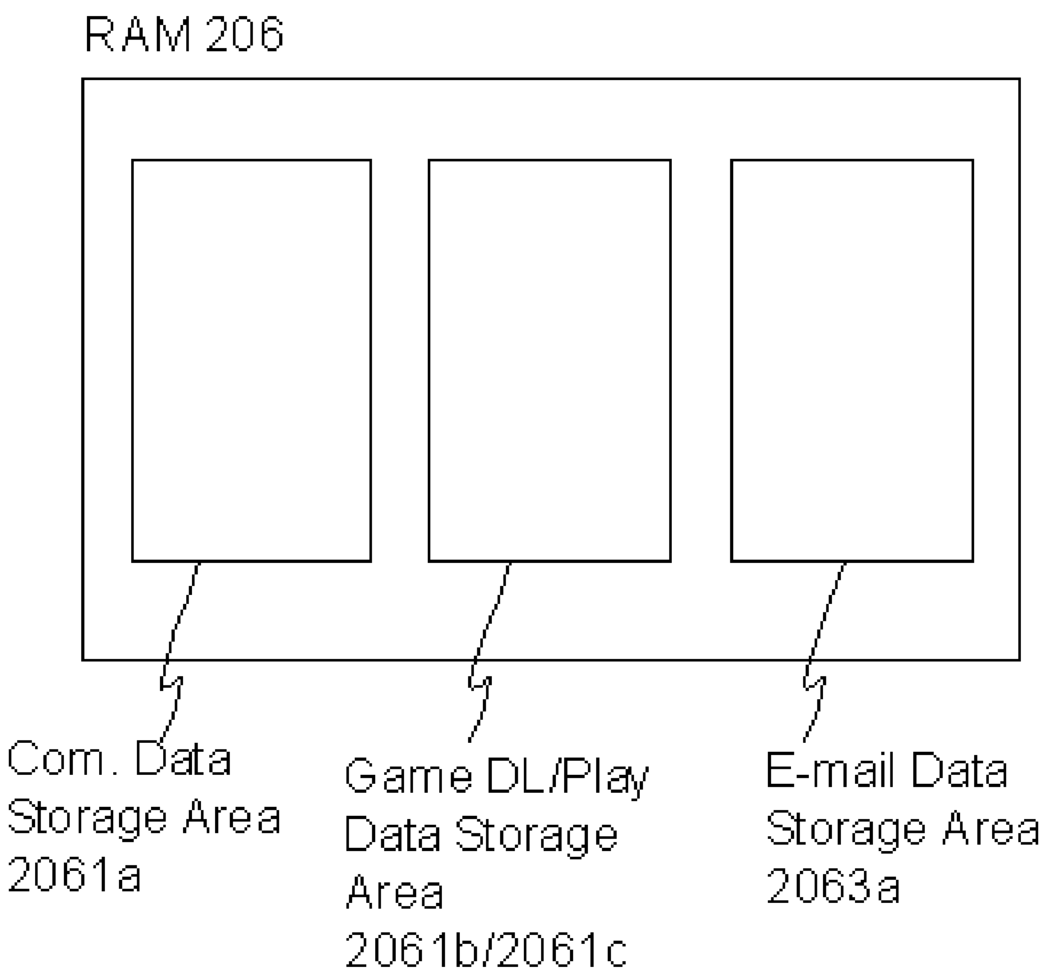

FIG. 157 is a block diagram illustrating an exemplary embodiment of the present invention.

Figure 157A:
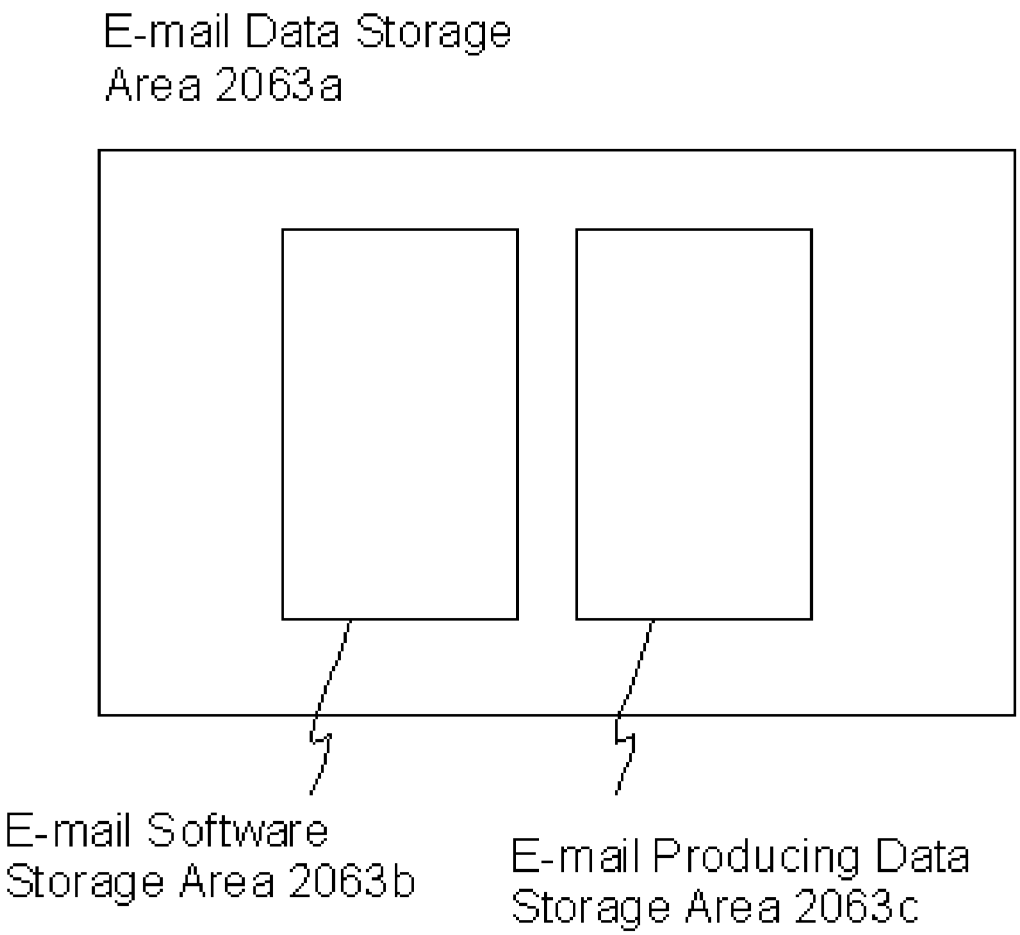

FIG. 157*a* is a block diagram illustrating an exemplary embodiment of the present invention.

Figure 158:
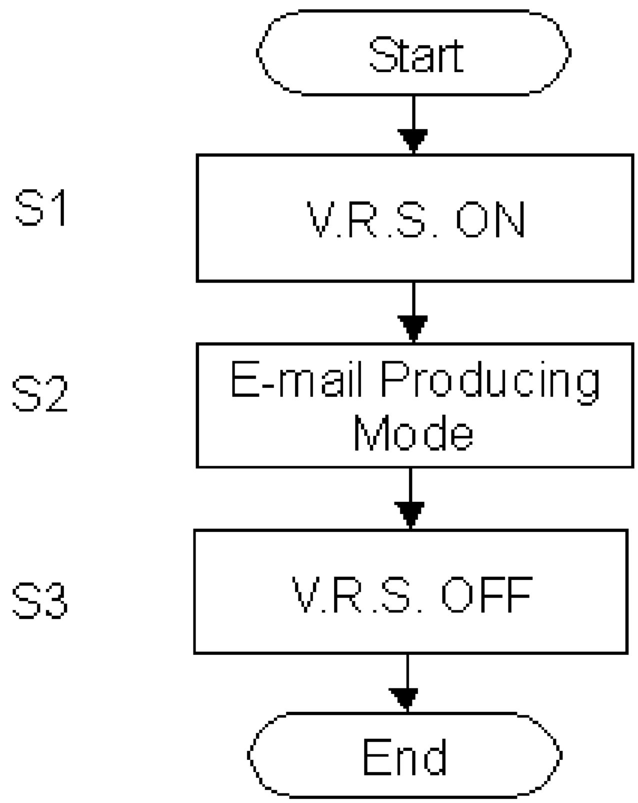

FIG. 158 is a flowchart illustrating an exemplary embodiment of the present invention.

Figure 159:
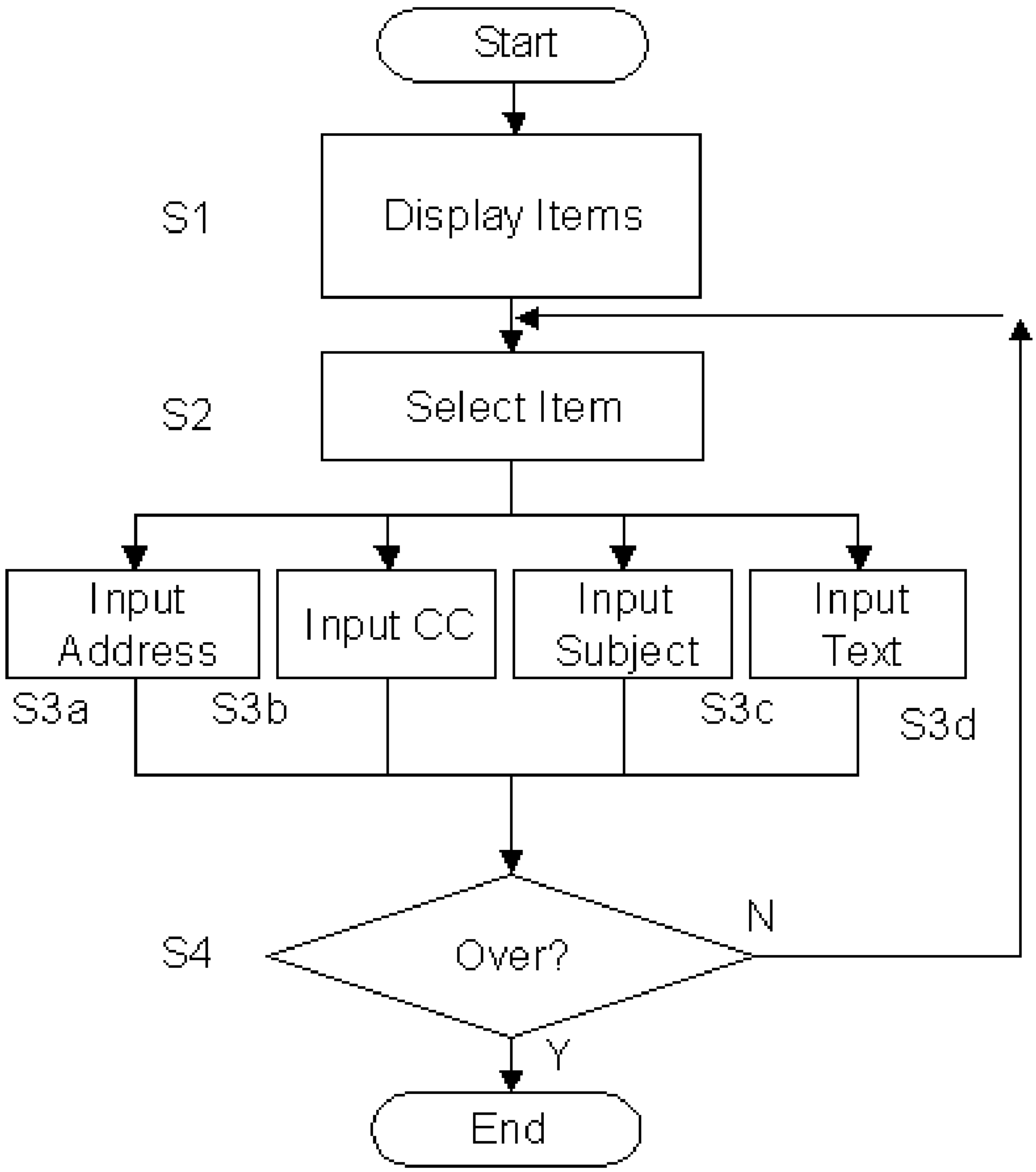

FIG. 159 is a flowchart illustrating an exemplary embodiment of the present invention.

Figure 160:
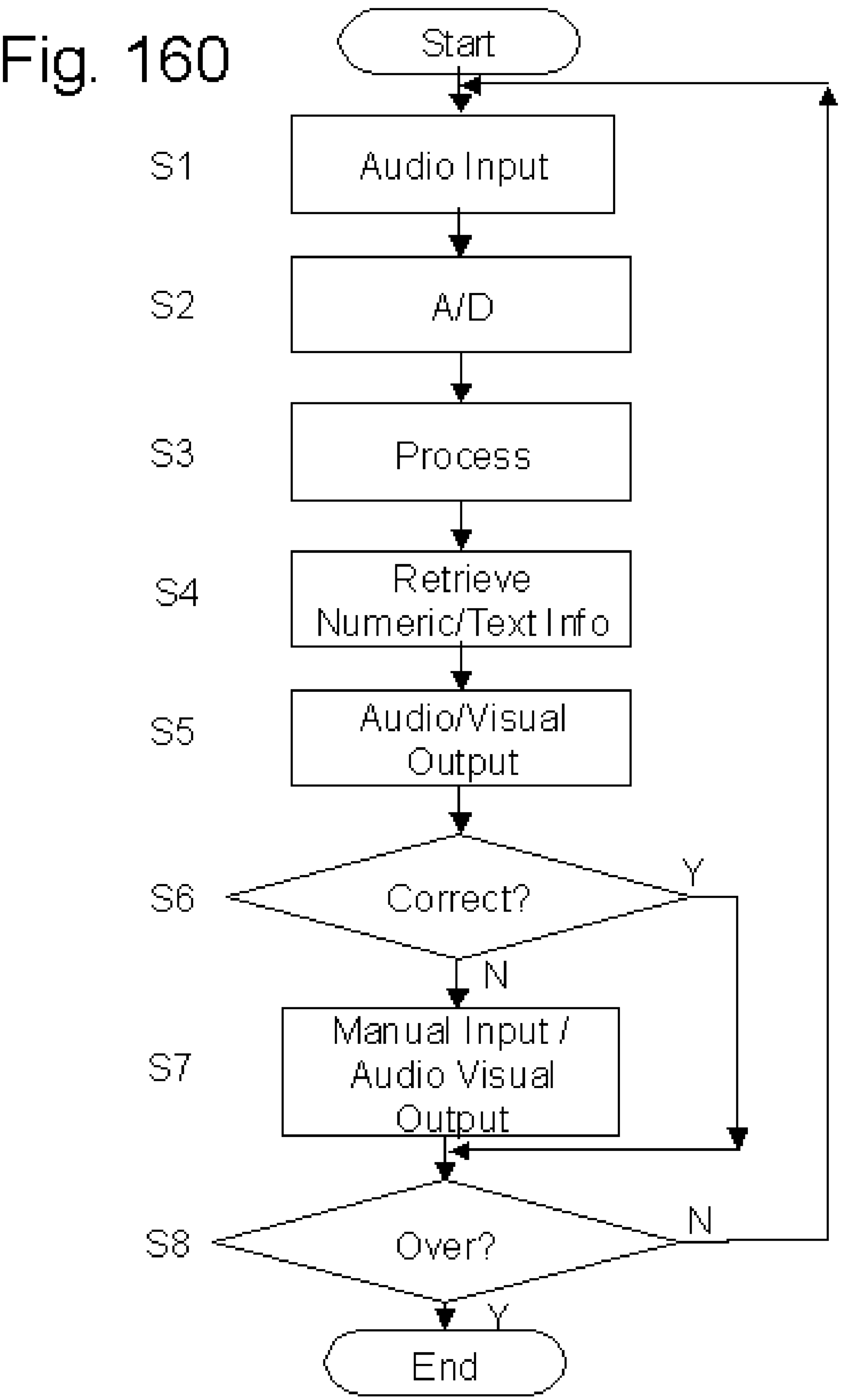

FIG. 160 is a flowchart illustrating an exemplary embodiment of the present invention.

Figure 161:
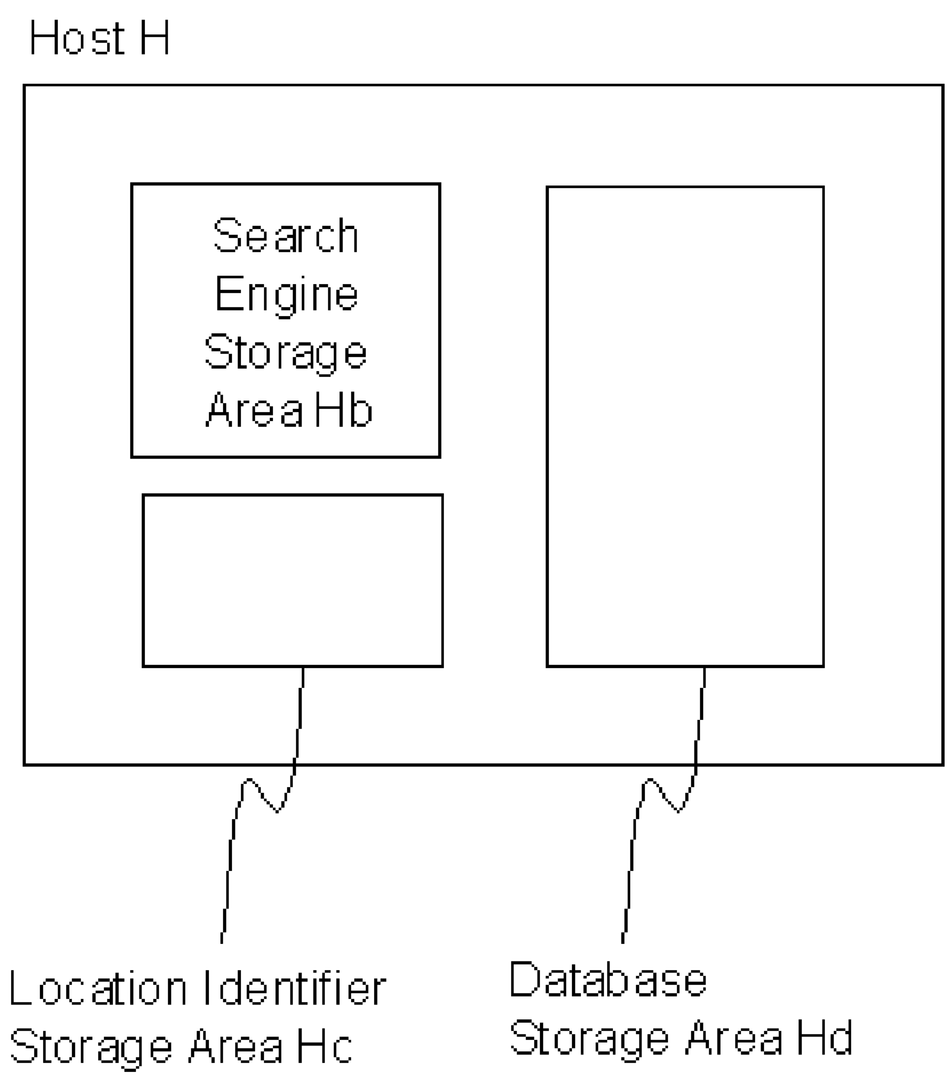

FIG. 161 is a block diagram illustrating an exemplary embodiment of the present invention.

Figure 162:
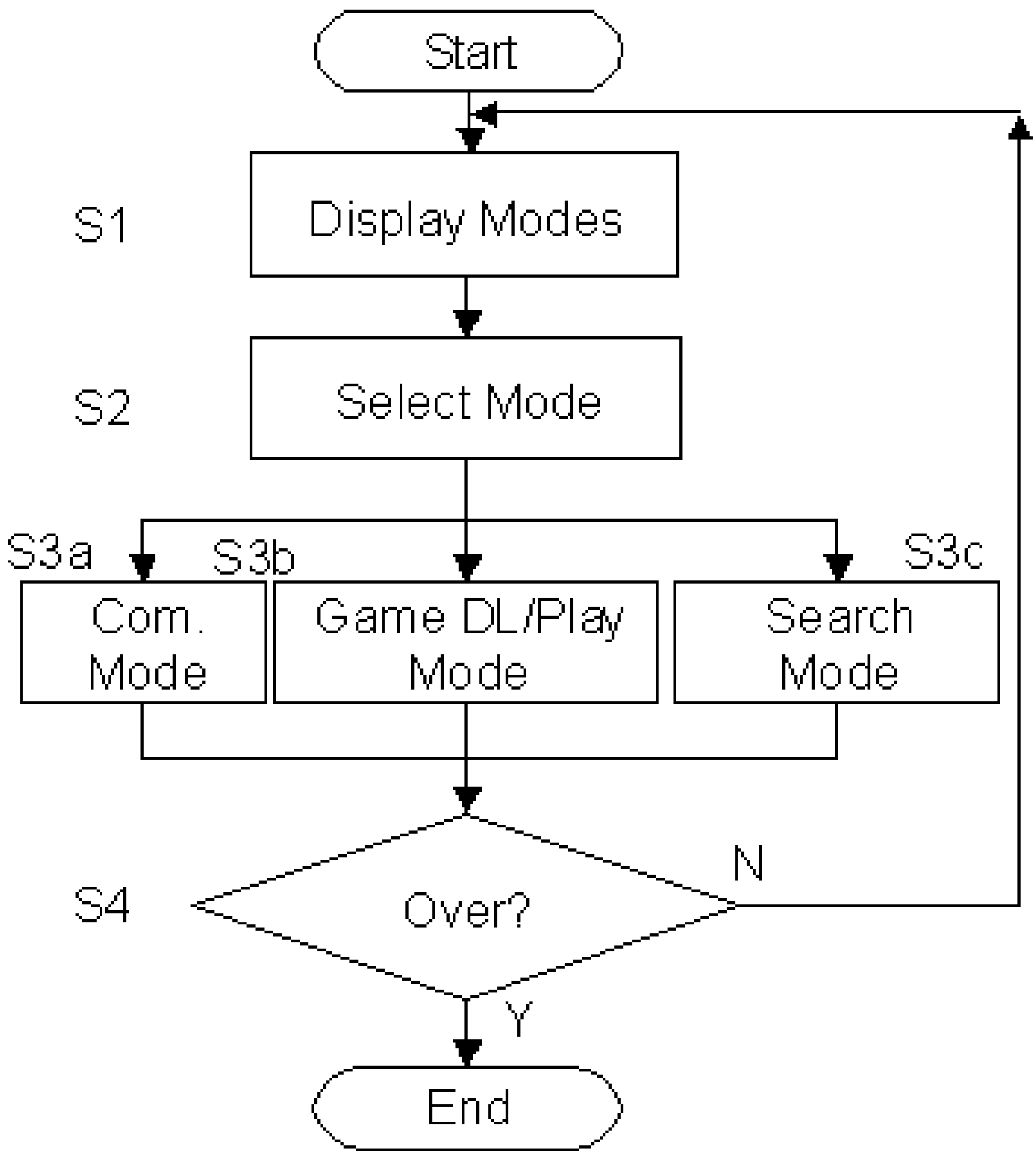

FIG. 162 is a flowchart illustrating an exemplary embodiment of the present invention.

Figure 163:
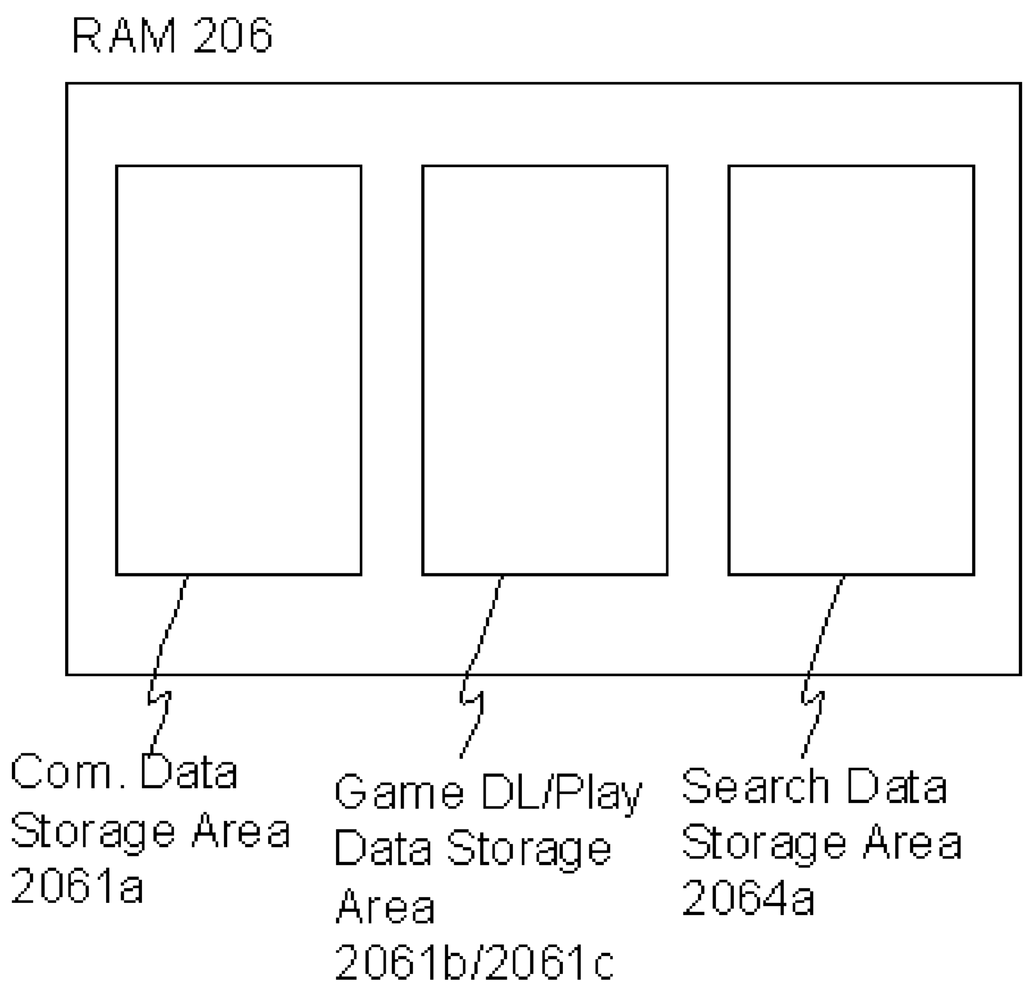

FIG. 163 is a block diagram illustrating an exemplary embodiment of the present invention.

Figure 164:
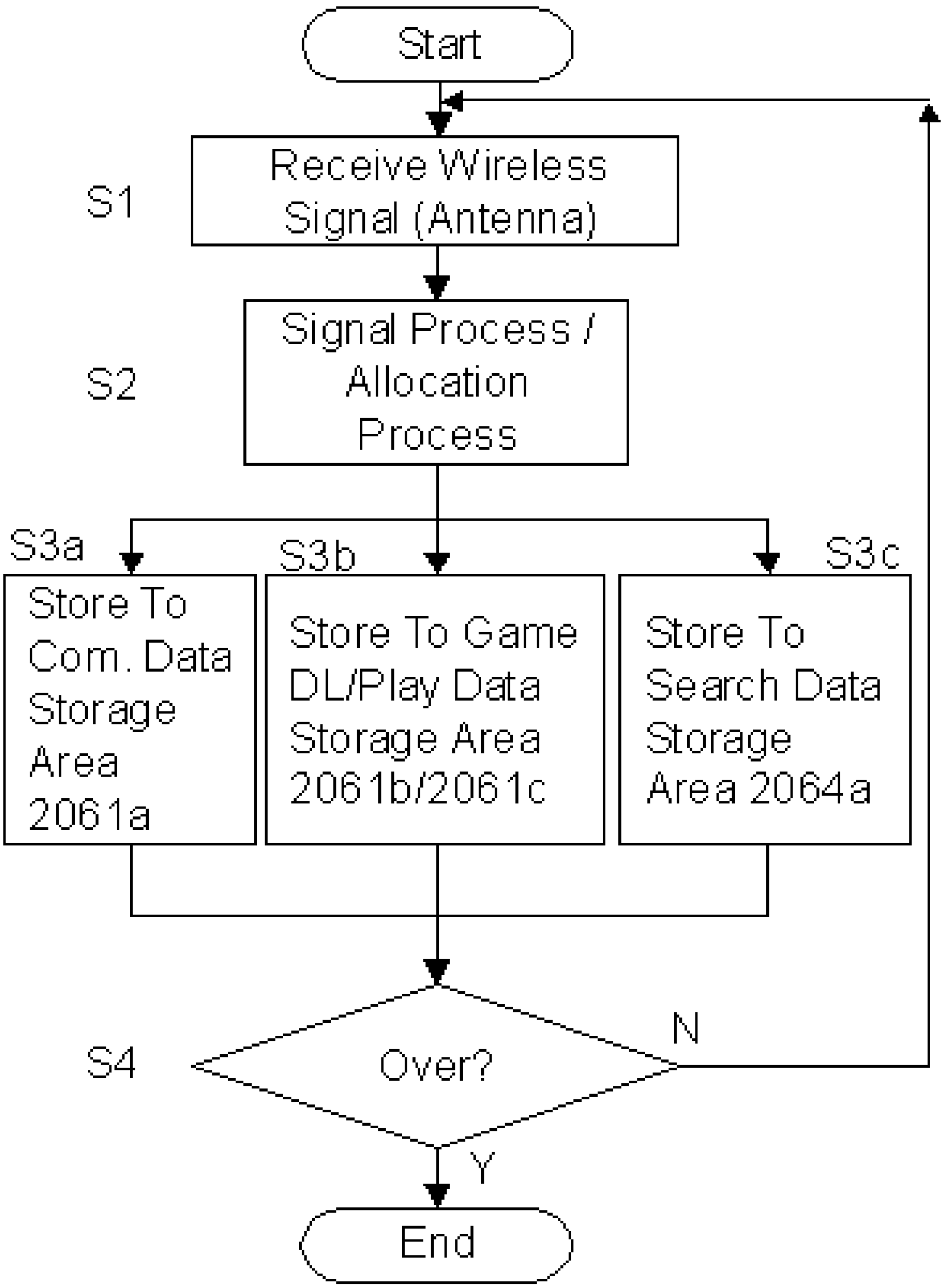

FIG. 164 is a flowchart illustrating an exemplary embodiment of the present invention.

Figure 165:
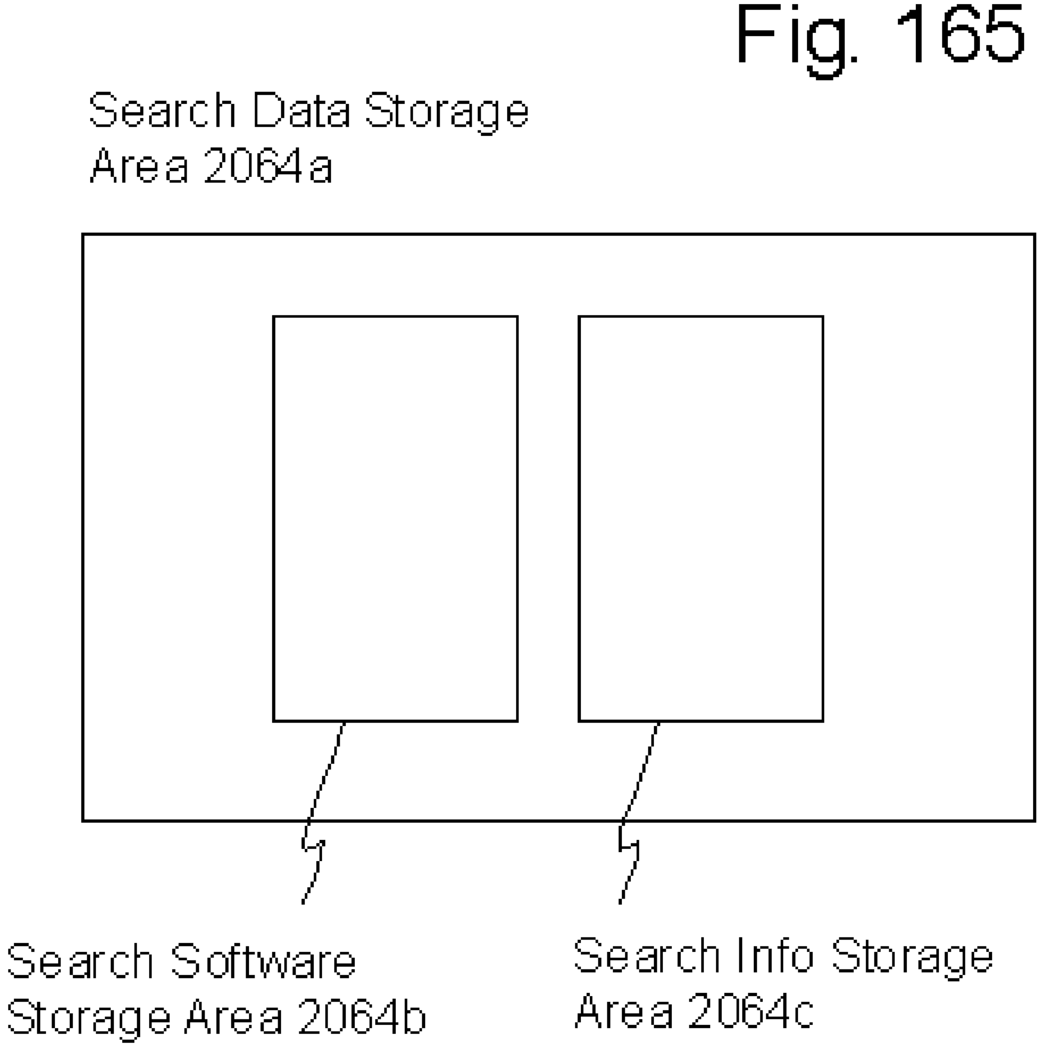

FIG. 165 is a block diagram illustrating an exemplary embodiment of the present invention.

FIG. 166 is a block diagram illustrating an exemplary embodiment of the present invention.

Figure 167:
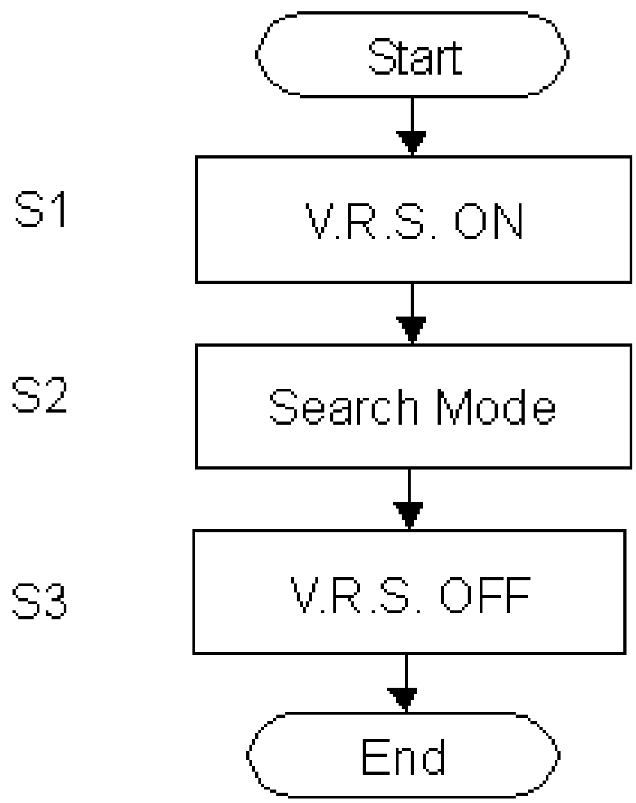

FIG. 167 is a flowchart illustrating an exemplary embodiment of the present invention.

Figure 167A:
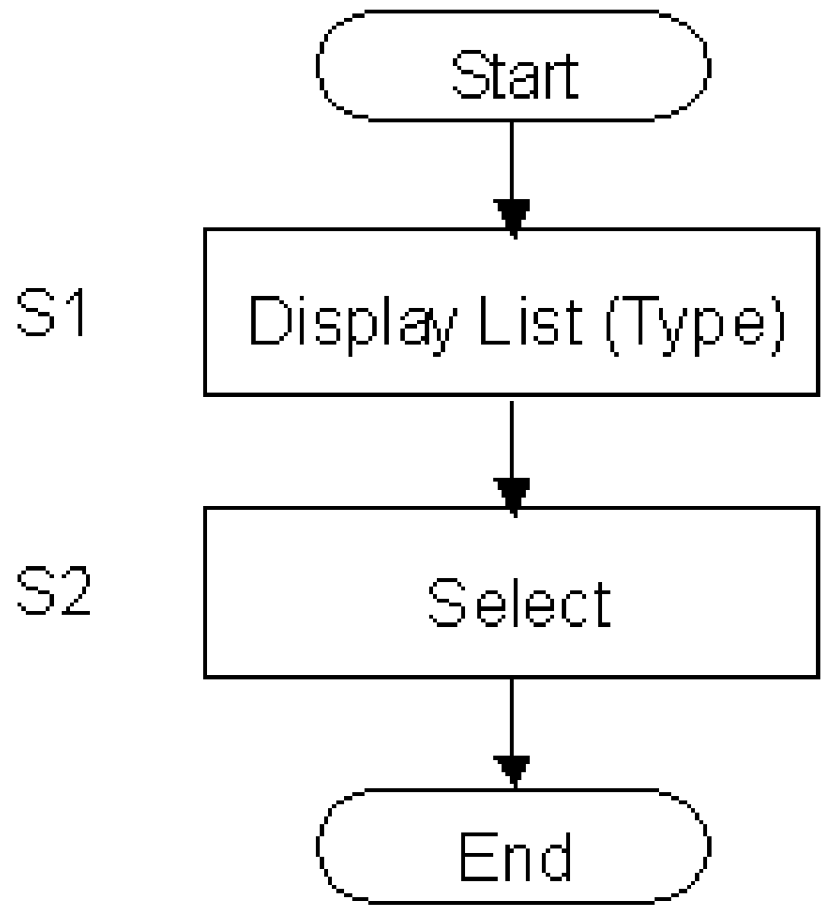

FIG. 167*a* is a flowchart illustrating an exemplary embodiment of the present invention.

Figure 168A:
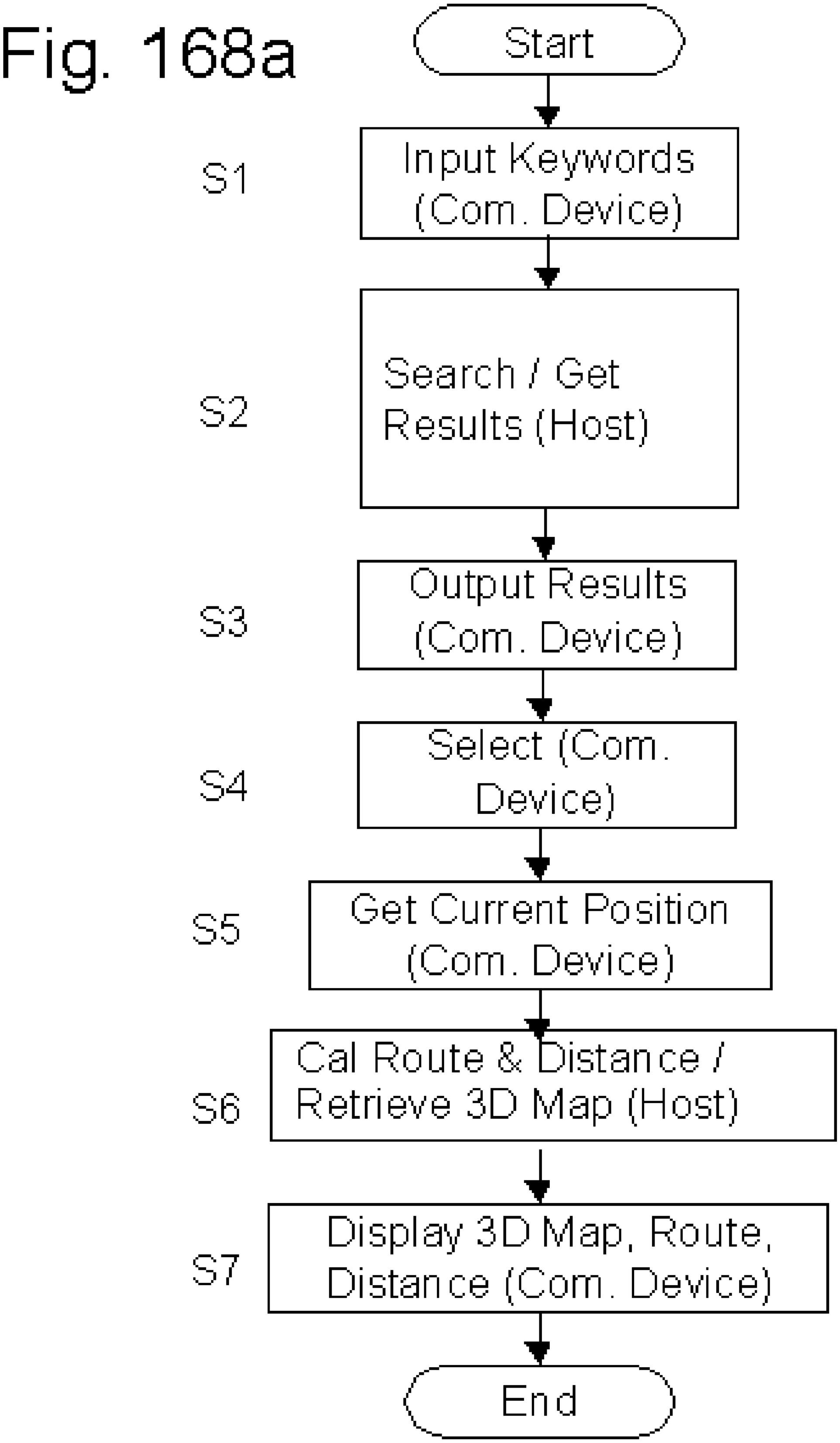

FIG. 168*a* is a flowchart illustrating an exemplary embodiment of the present invention.

Figure 168B:
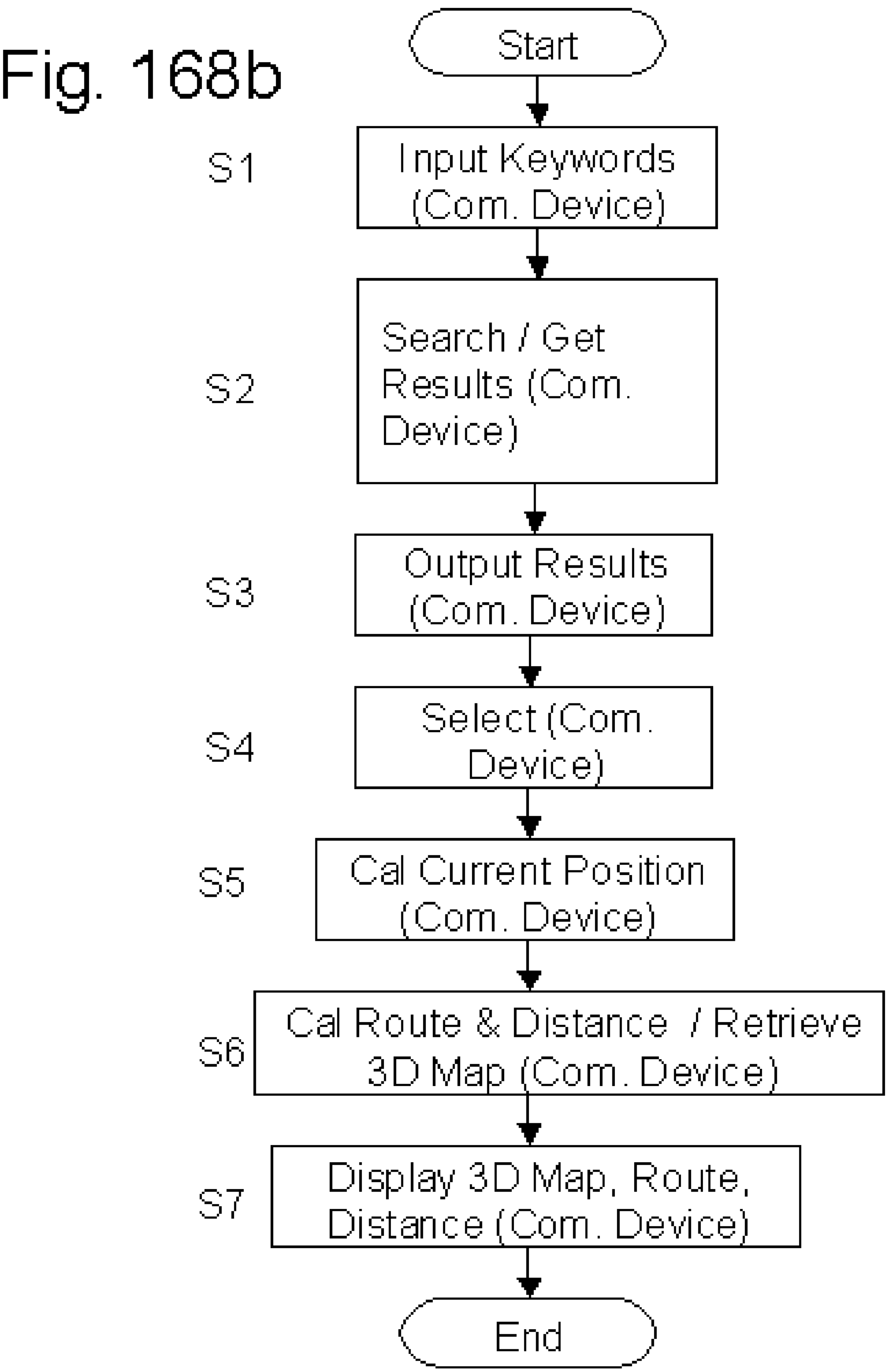

FIG. 168*b* is a flowchart illustrating an exemplary embodiment of the present invention.

Figure 169A:
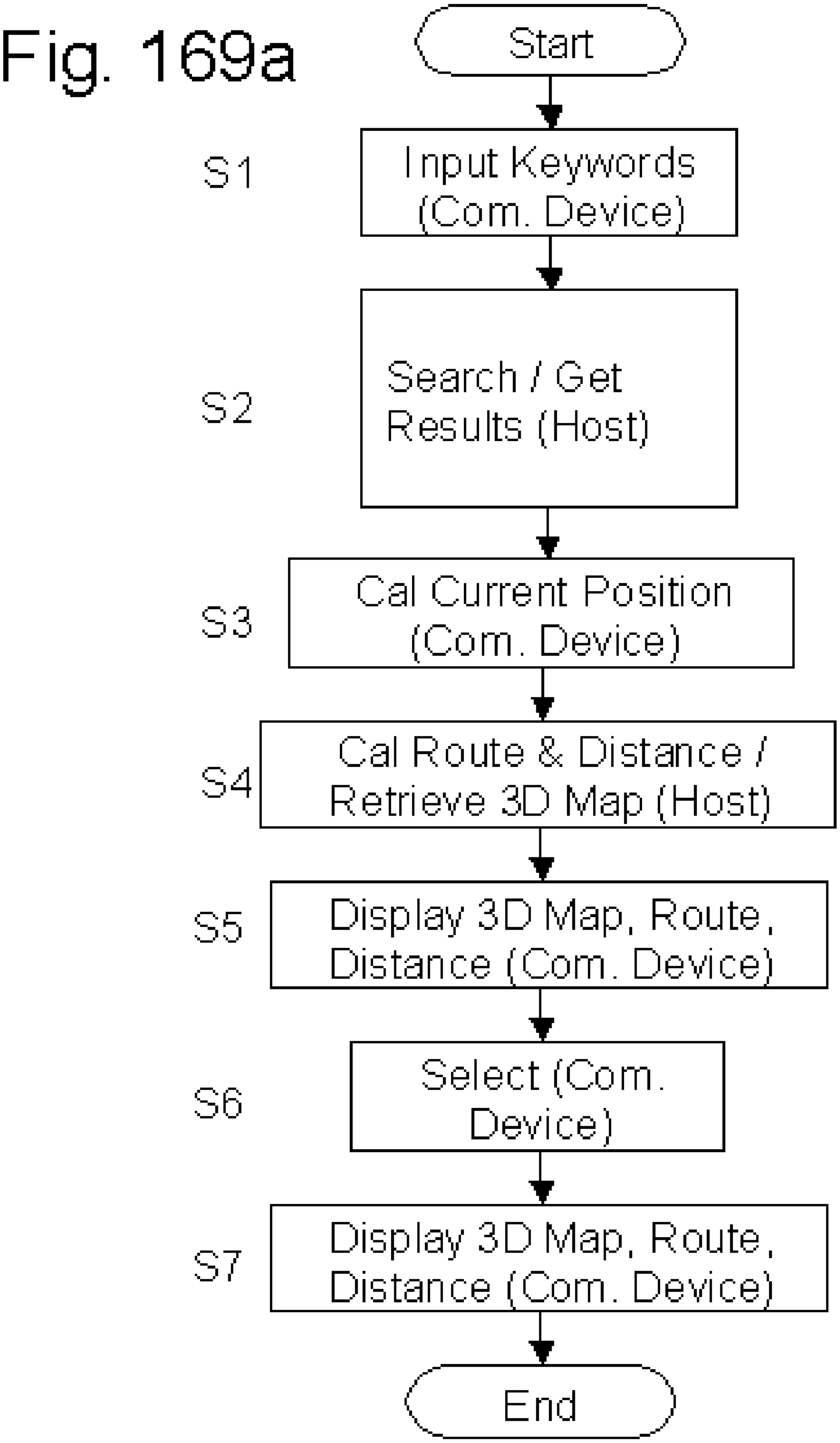

FIG. 169*a* is a flowchart illustrating an exemplary embodiment of the present invention.

Figure 169B:
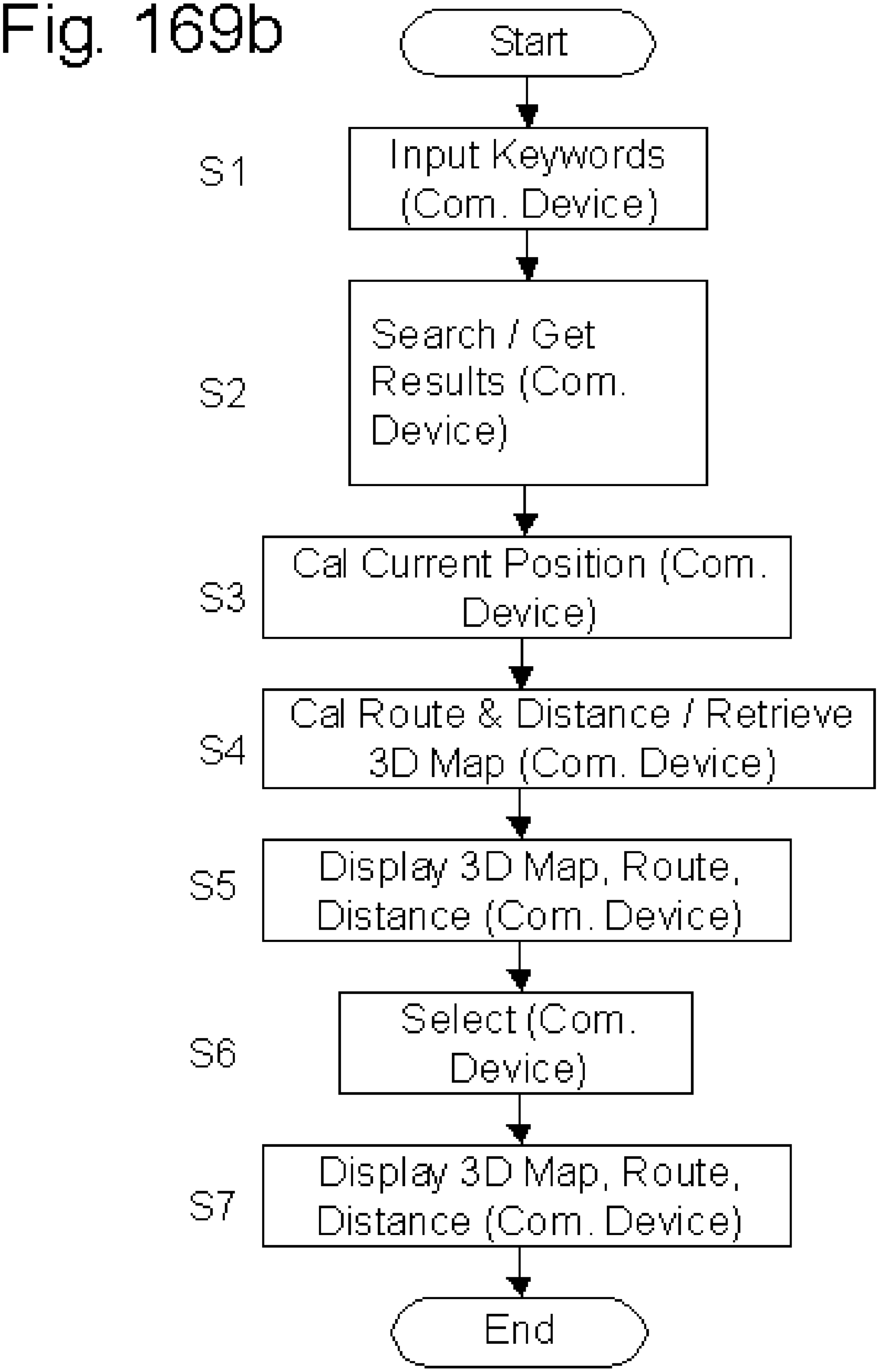

FIG. 169*b* is a flowchart illustrating an exemplary embodiment of the present invention.

Figure 169C:
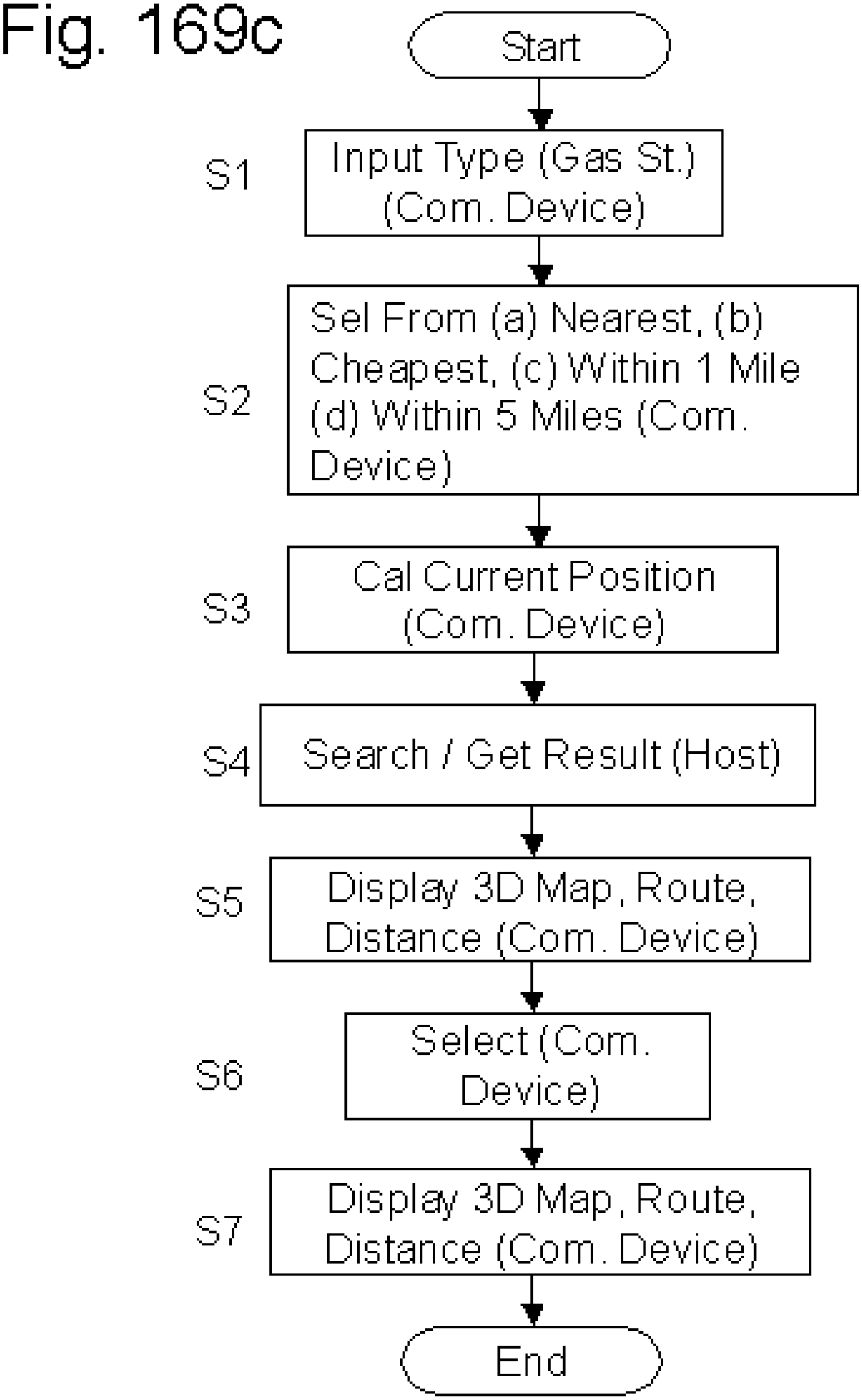

FIG. 169*c* is a flowchart illustrating an exemplary embodiment of the present invention.

Figure 169D:
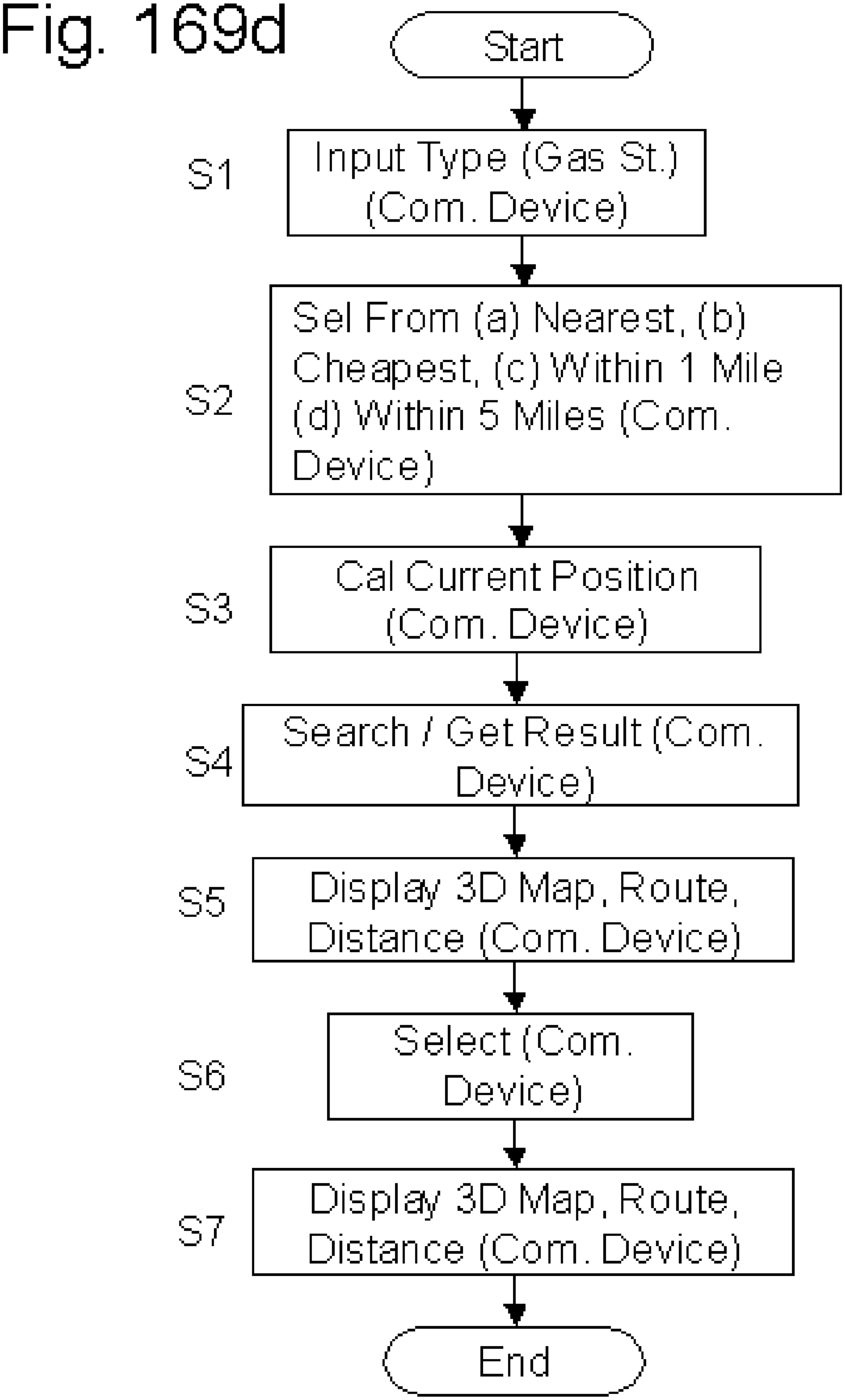

FIG. 169*d* is a flowchart illustrating an exemplary embodiment of the present invention.

Figure 170:
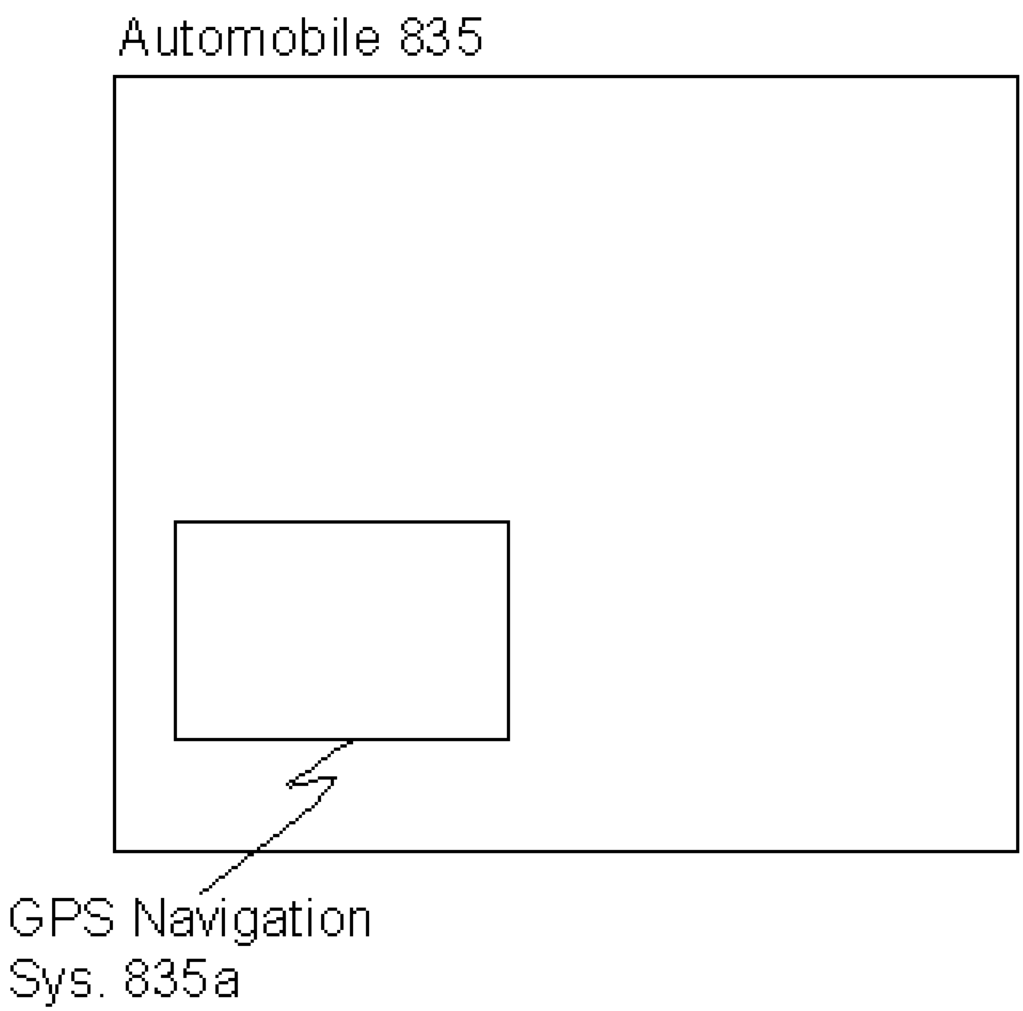

FIG. 170 is a block diagram illustrating an exemplary embodiment of the present invention.

Figure 171:
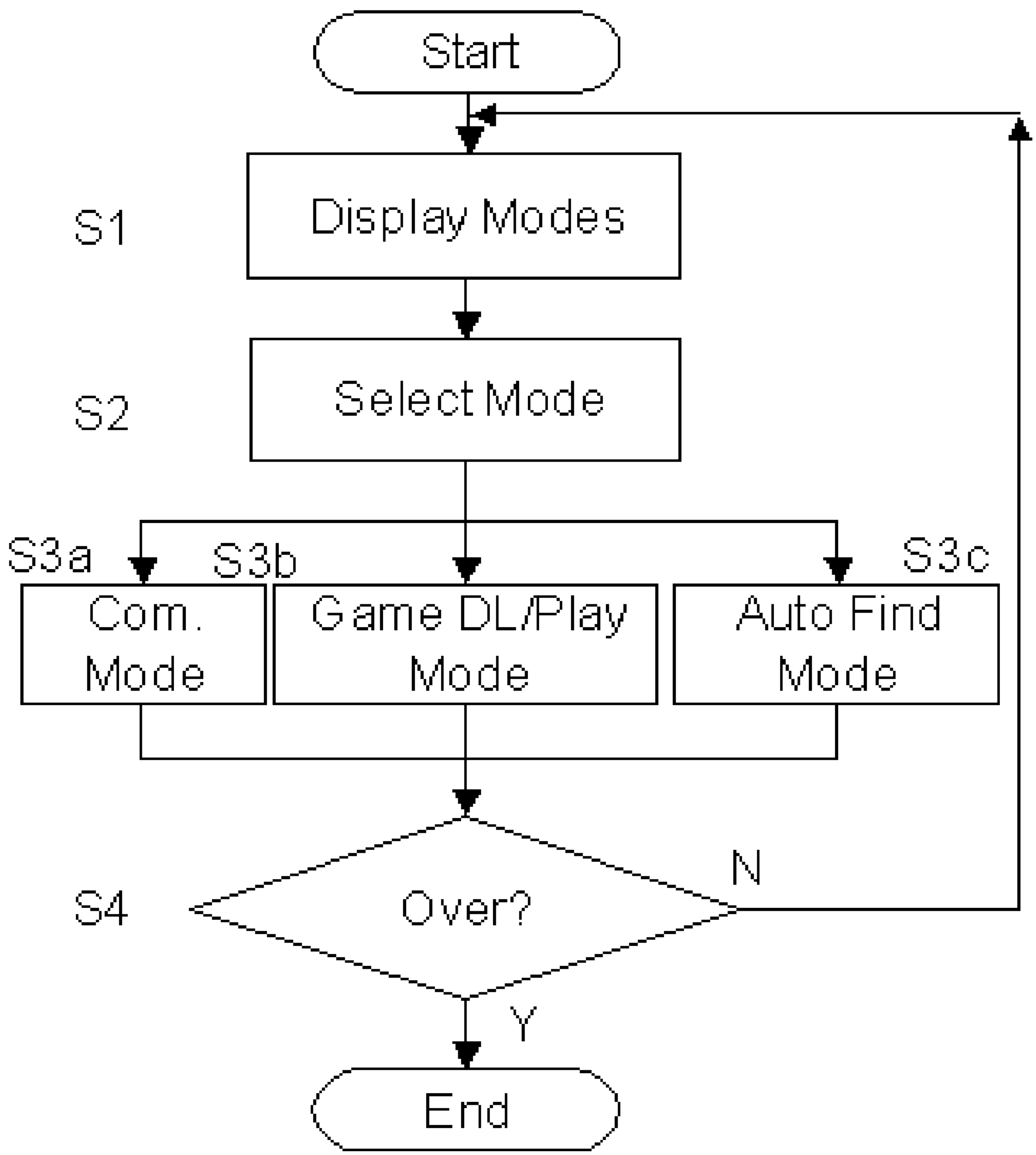

FIG. 171 is a flowchart illustrating an exemplary embodiment of the present invention.

Figure 172:
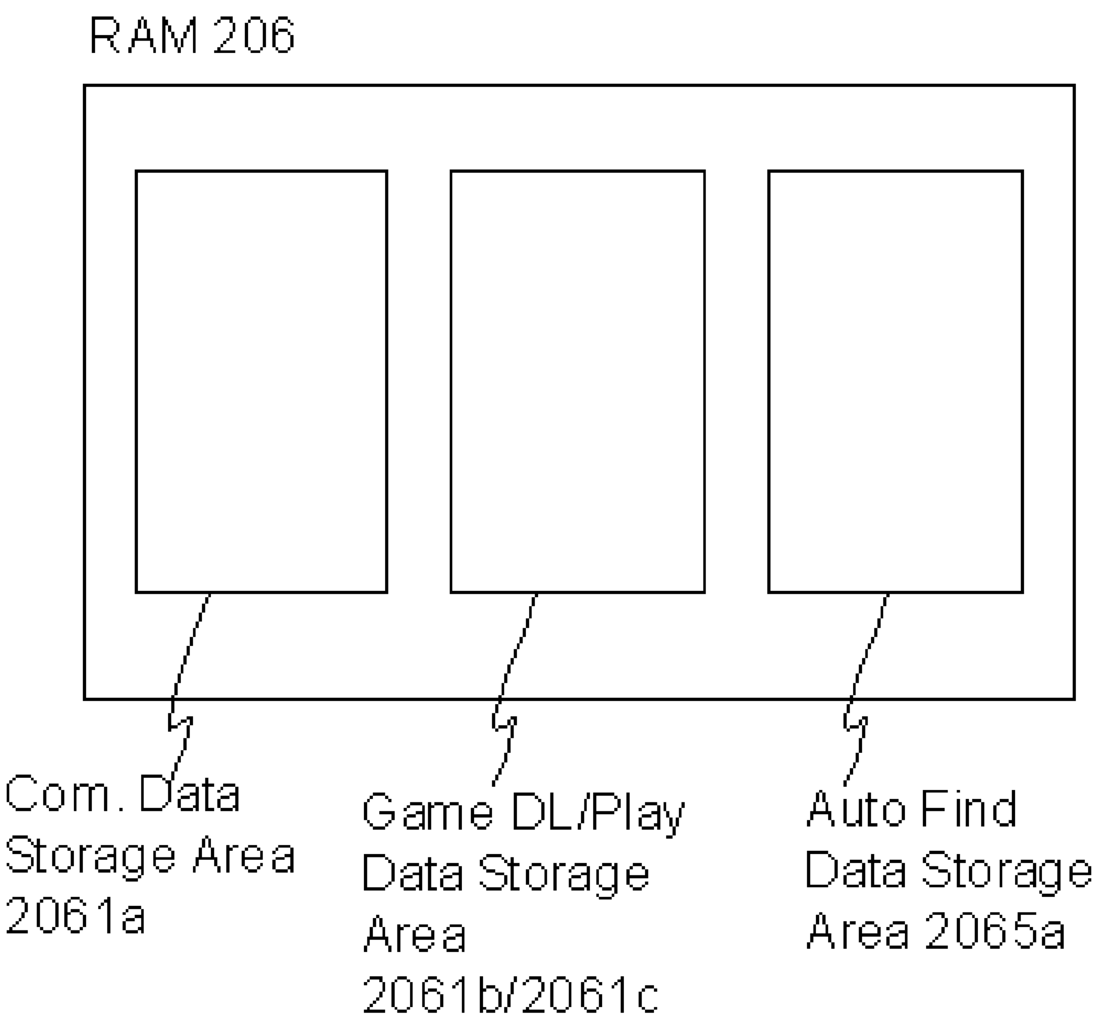

FIG. 172 is a block diagram illustrating an exemplary embodiment of the present invention.

Figure 173:
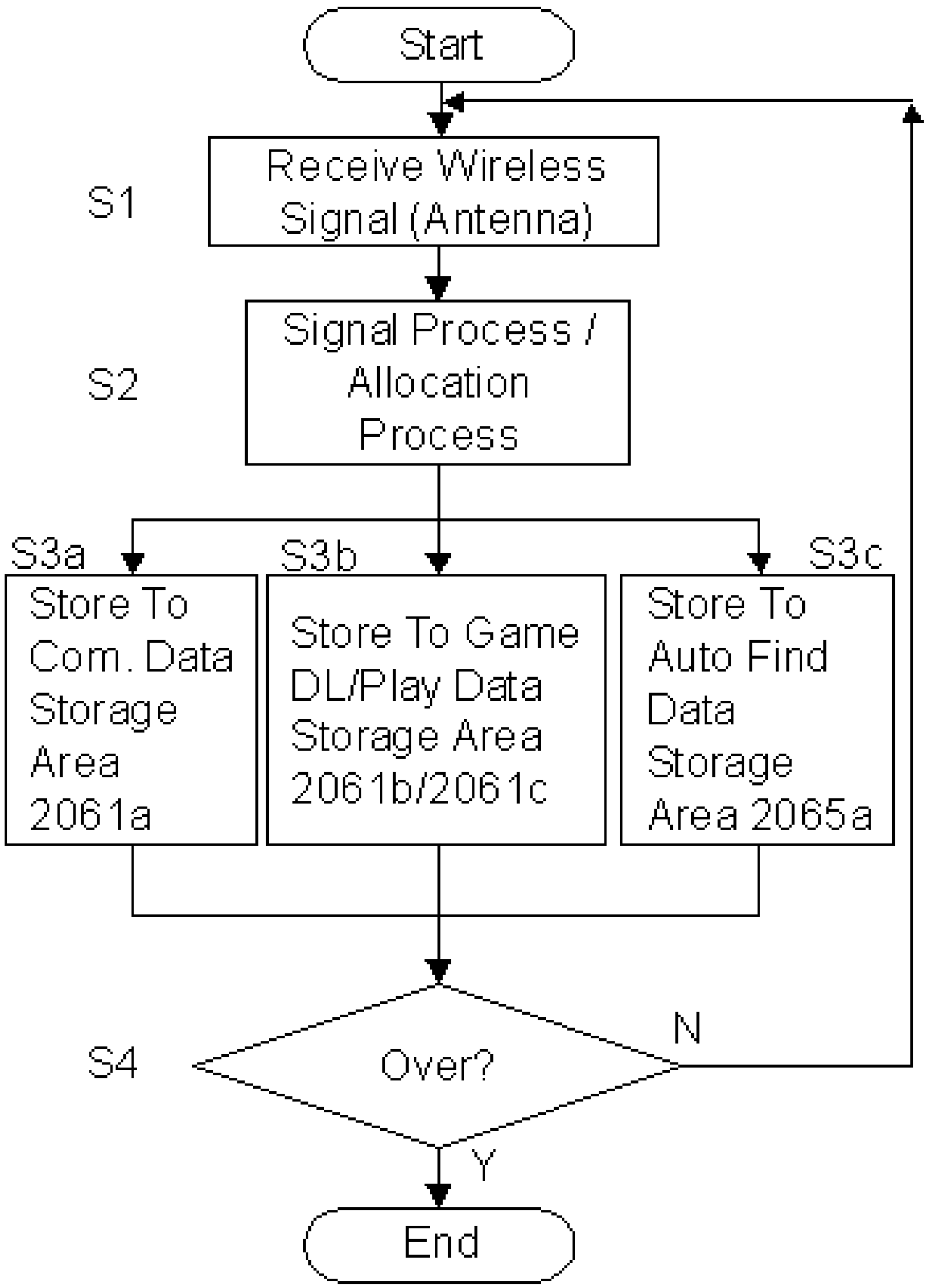

FIG. 173 is a flowchart illustrating an exemplary embodiment of the present invention.

Figure 174:
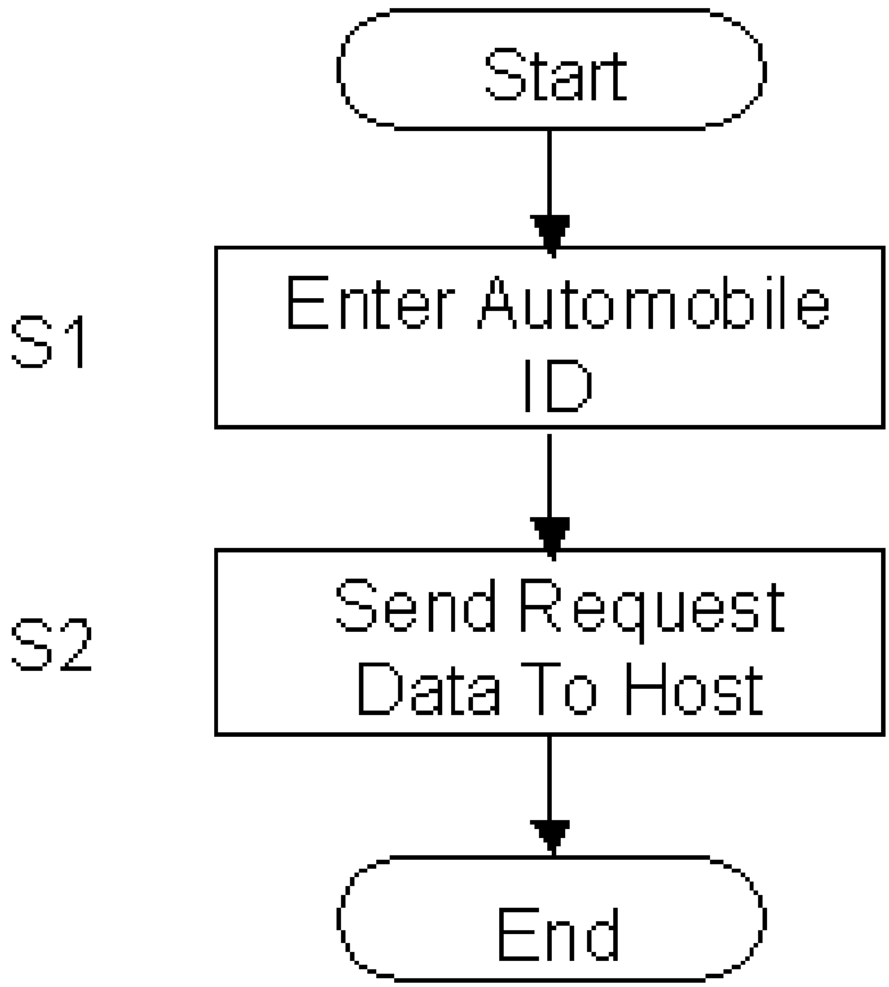

FIG. 174 is a flowchart illustrating an exemplary embodiment of the present invention.

Figure 175:
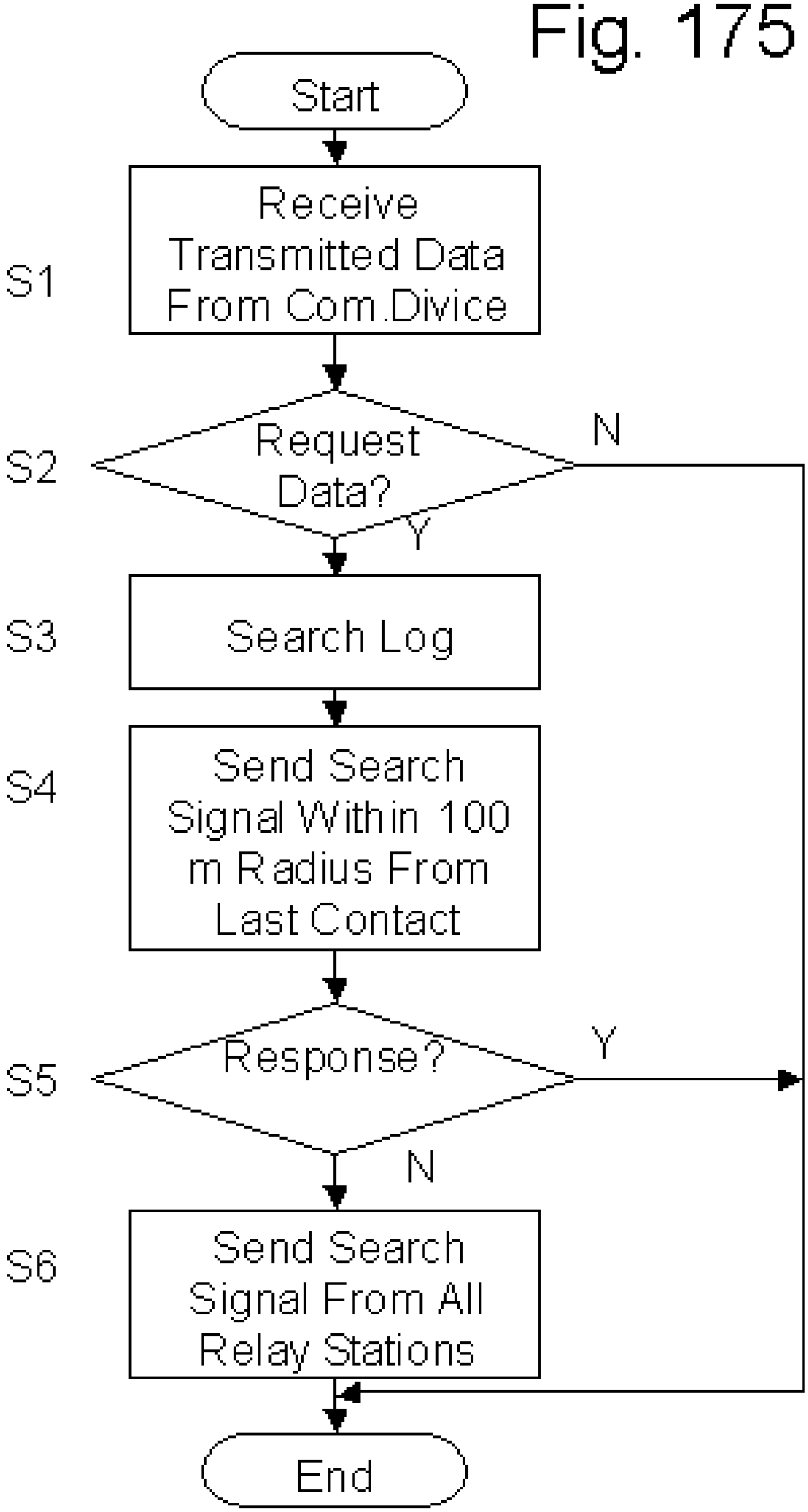

FIG. 175 is a flowchart illustrating an exemplary embodiment of the present invention.

Figure 176:
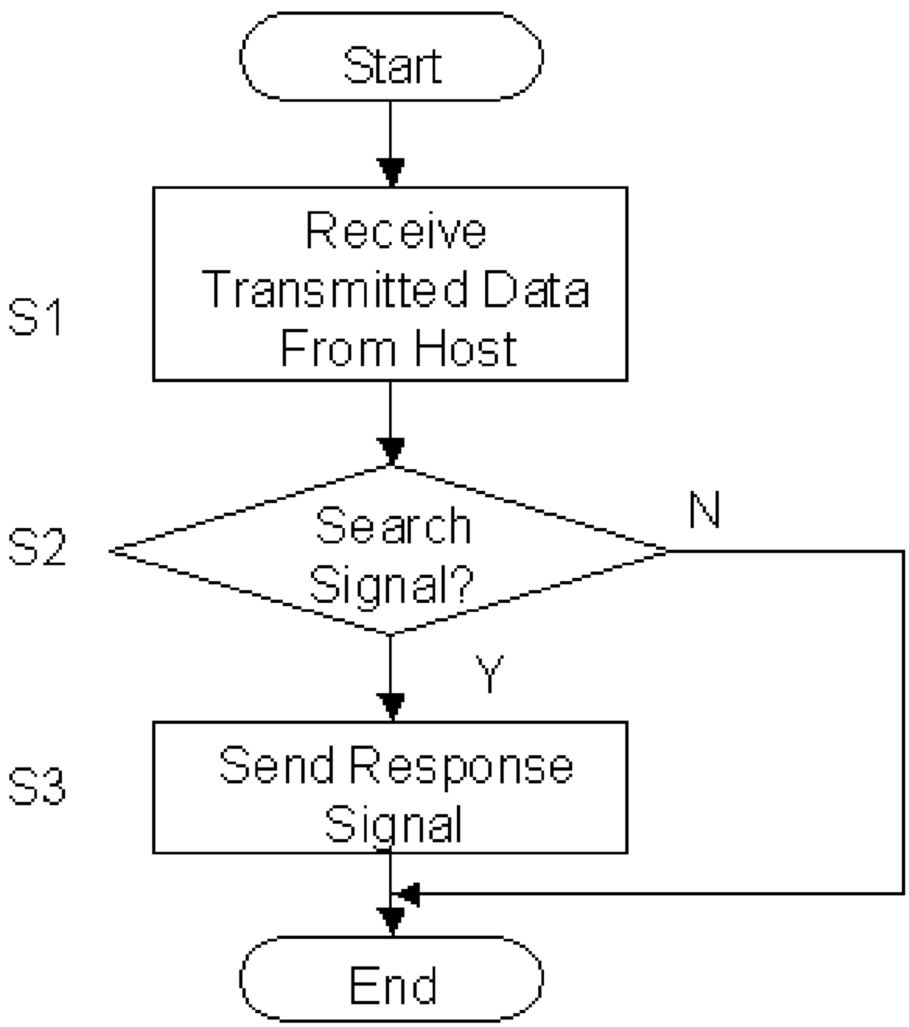

FIG. 176 is a flowchart illustrating an exemplary embodiment of the present invention.

Figure 177:
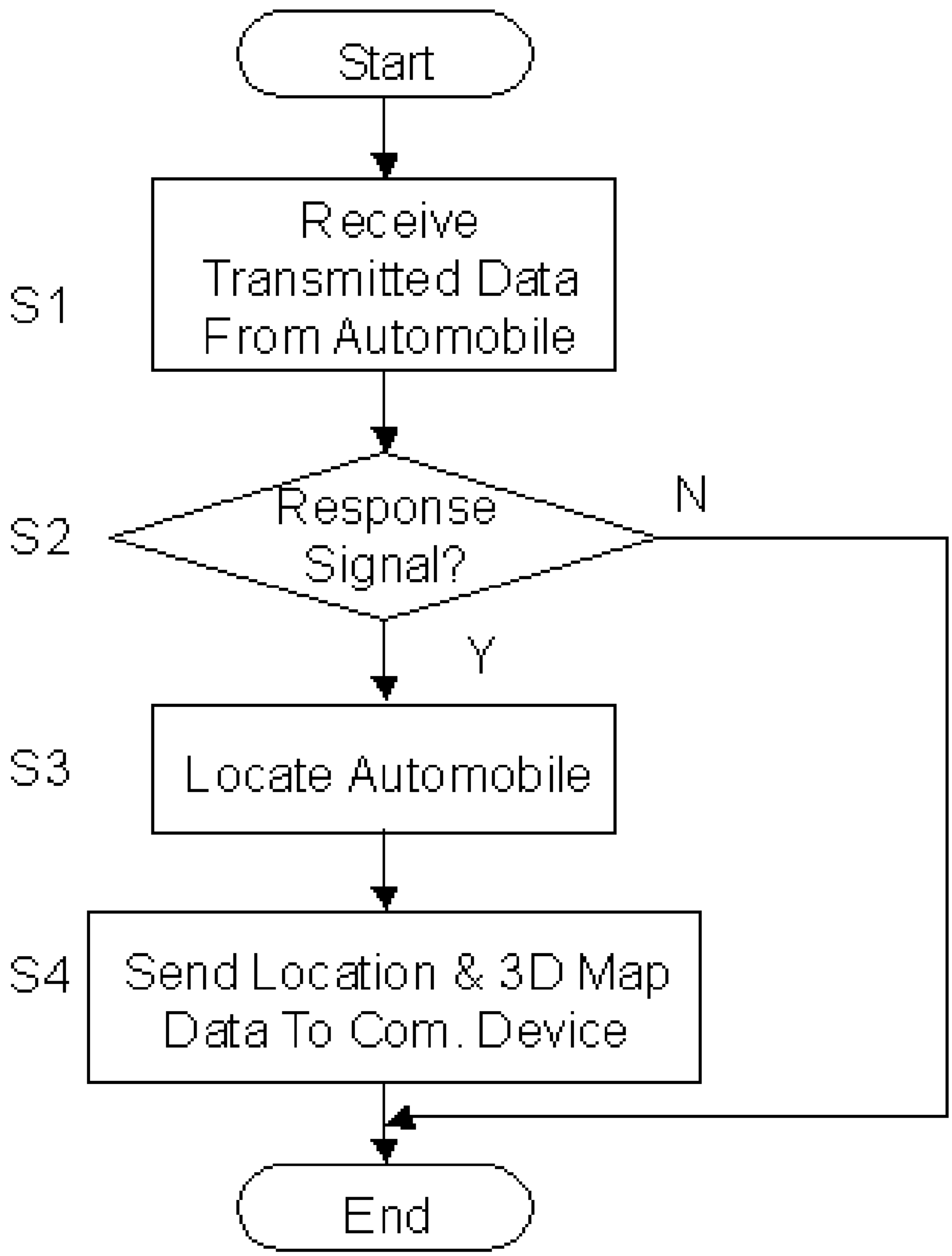

FIG. 177 is a flowchart illustrating an exemplary embodiment of the present invention.

Figure 178:
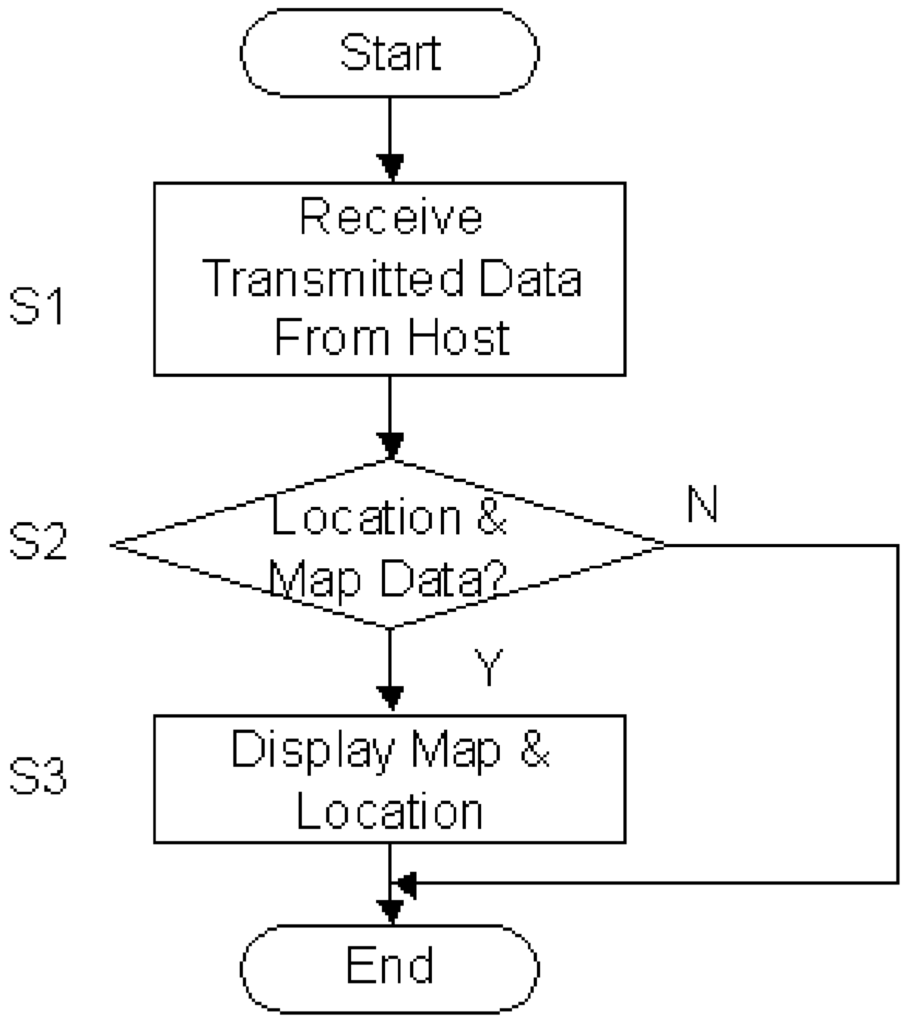

FIG. 178 is a flowchart illustrating an exemplary embodiment of the present invention.

Figure 179:
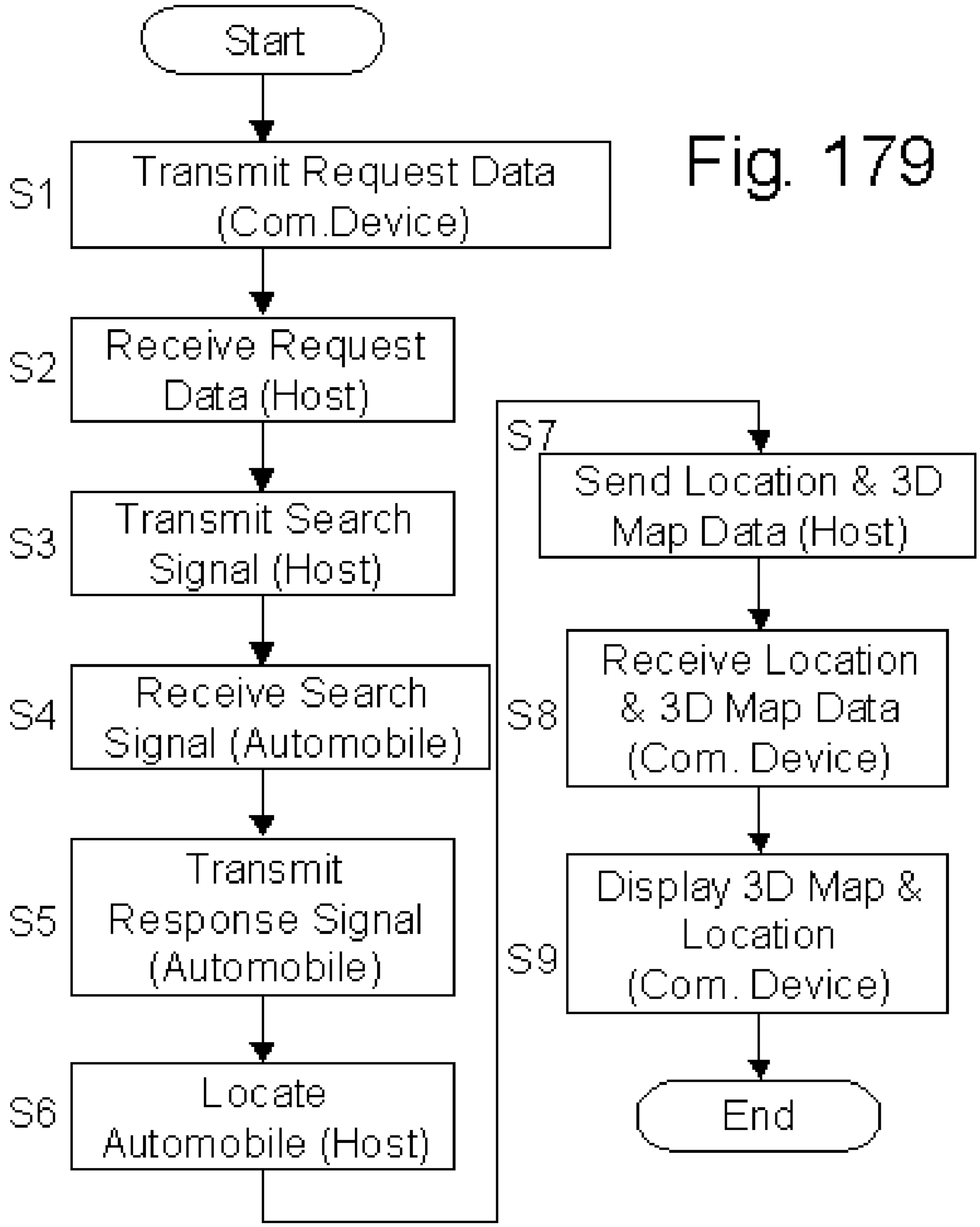

FIG. 179 is a flowchart illustrating an exemplary embodiment of the present invention.

Figure 180:
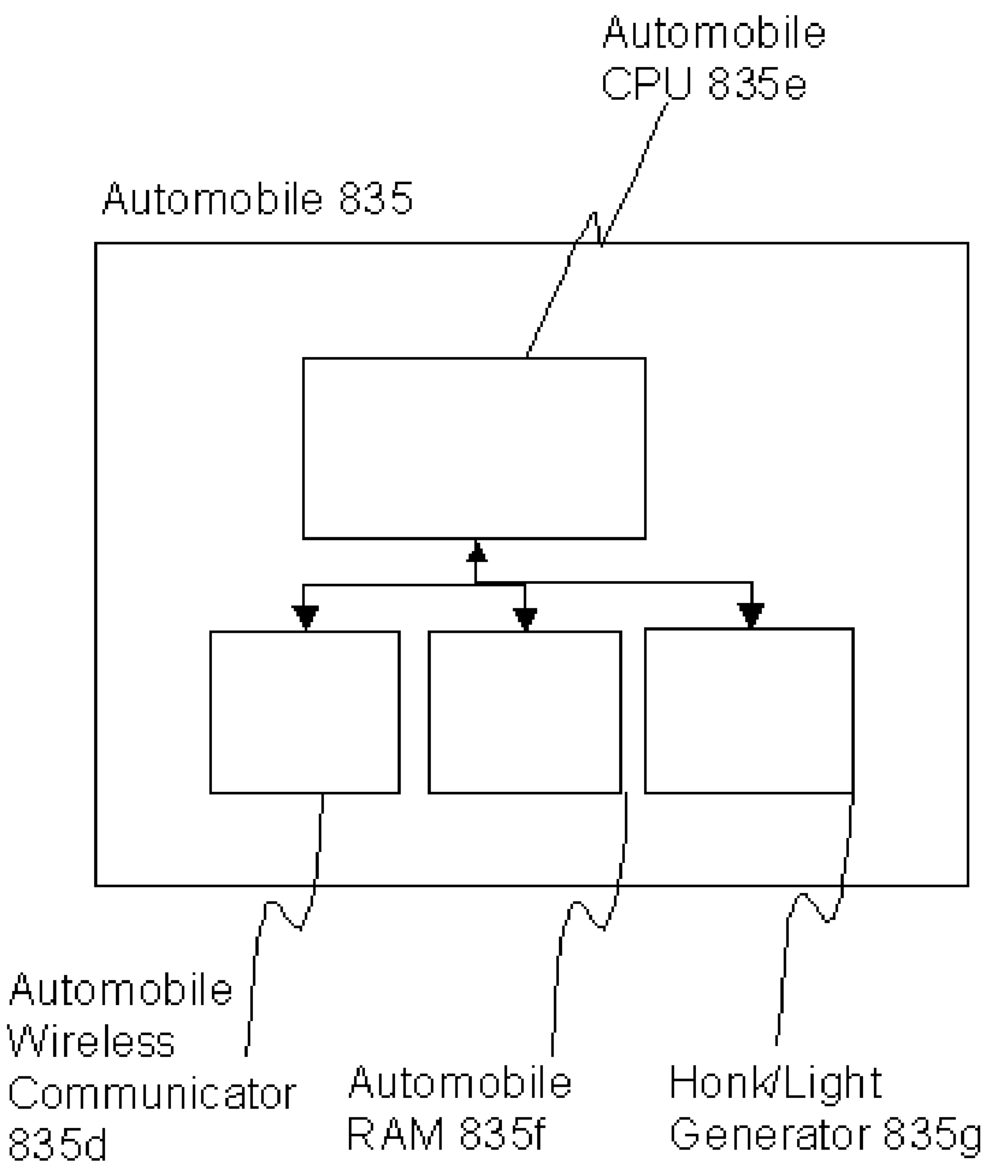

FIG. 180 is a block diagram illustrating an exemplary embodiment of the present invention.

Figure 181:
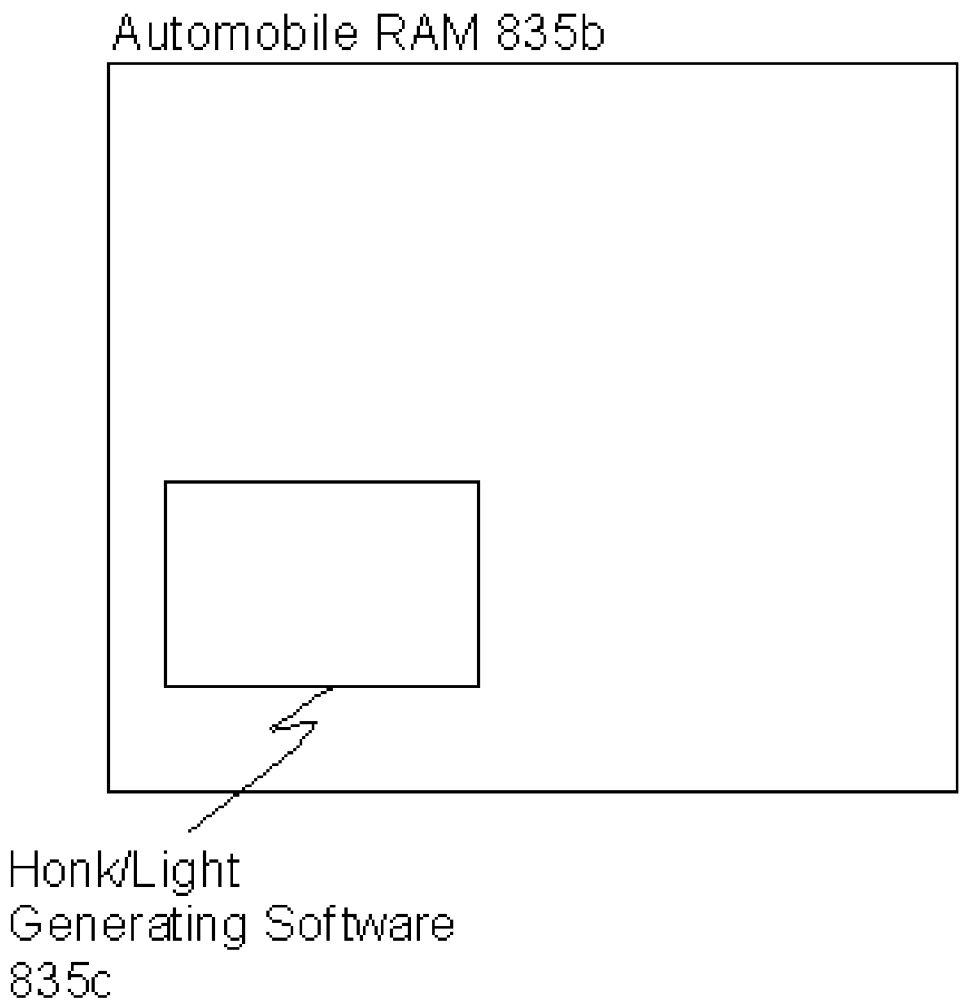

FIG. 181 is a block diagram illustrating an exemplary embodiment of the present invention.

Figure 181A:
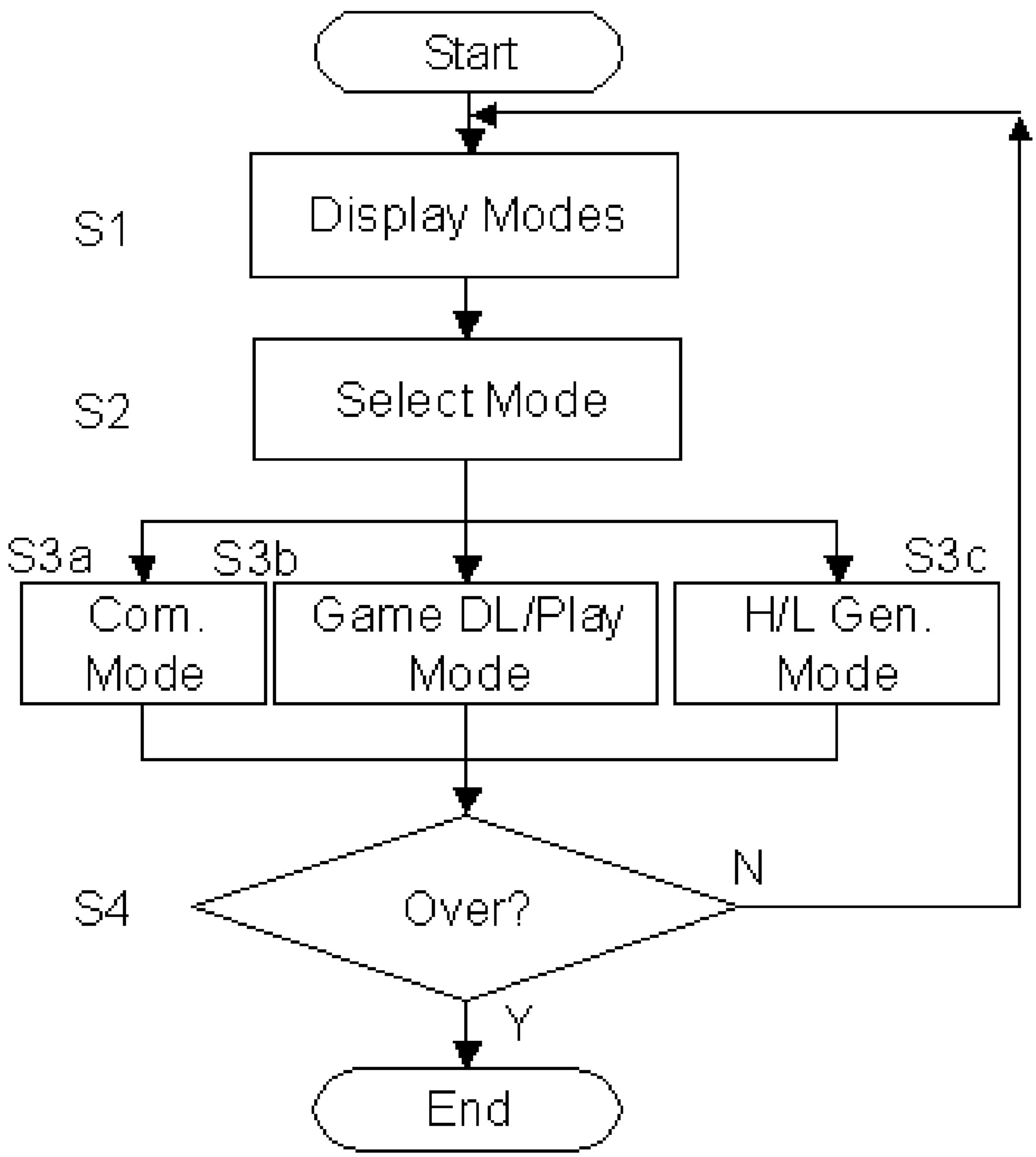

FIG. 181*a* is a flowchart illustrating an exemplary embodiment of the present invention.

Figure 181B:
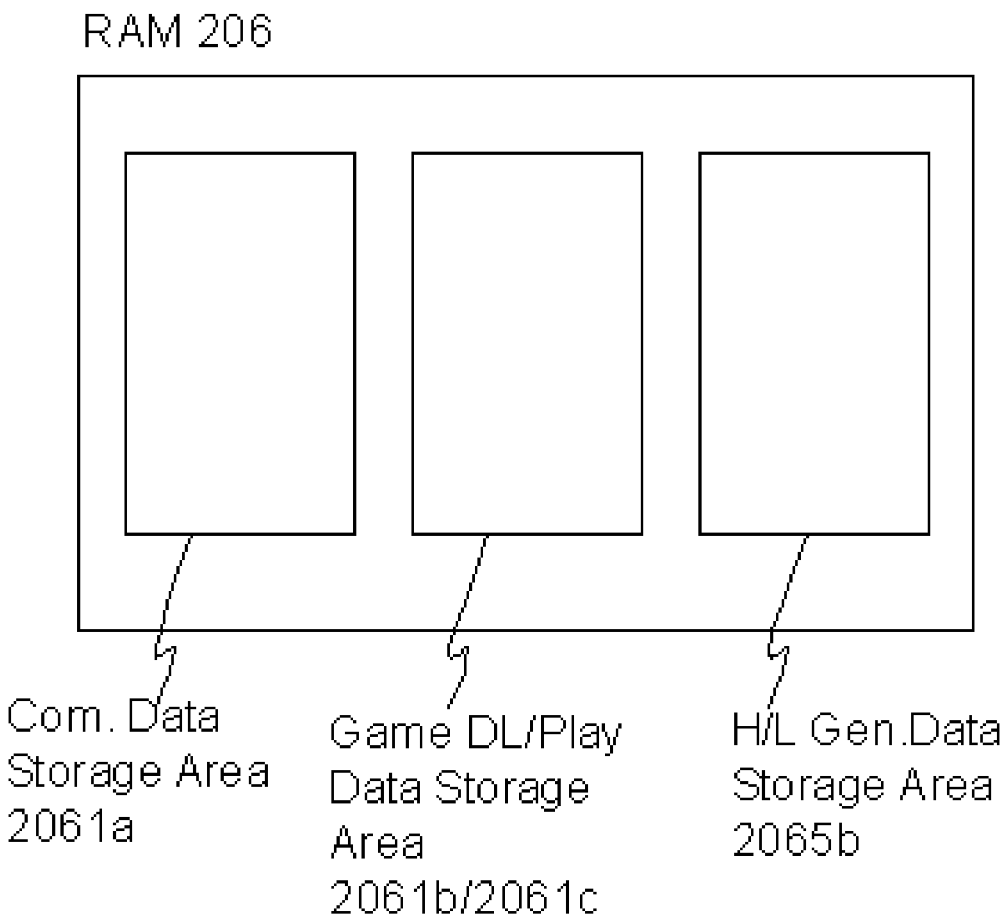

FIG. 181*b* is a flowchart illustrating an exemplary embodiment of the present invention.

Figure 181C:
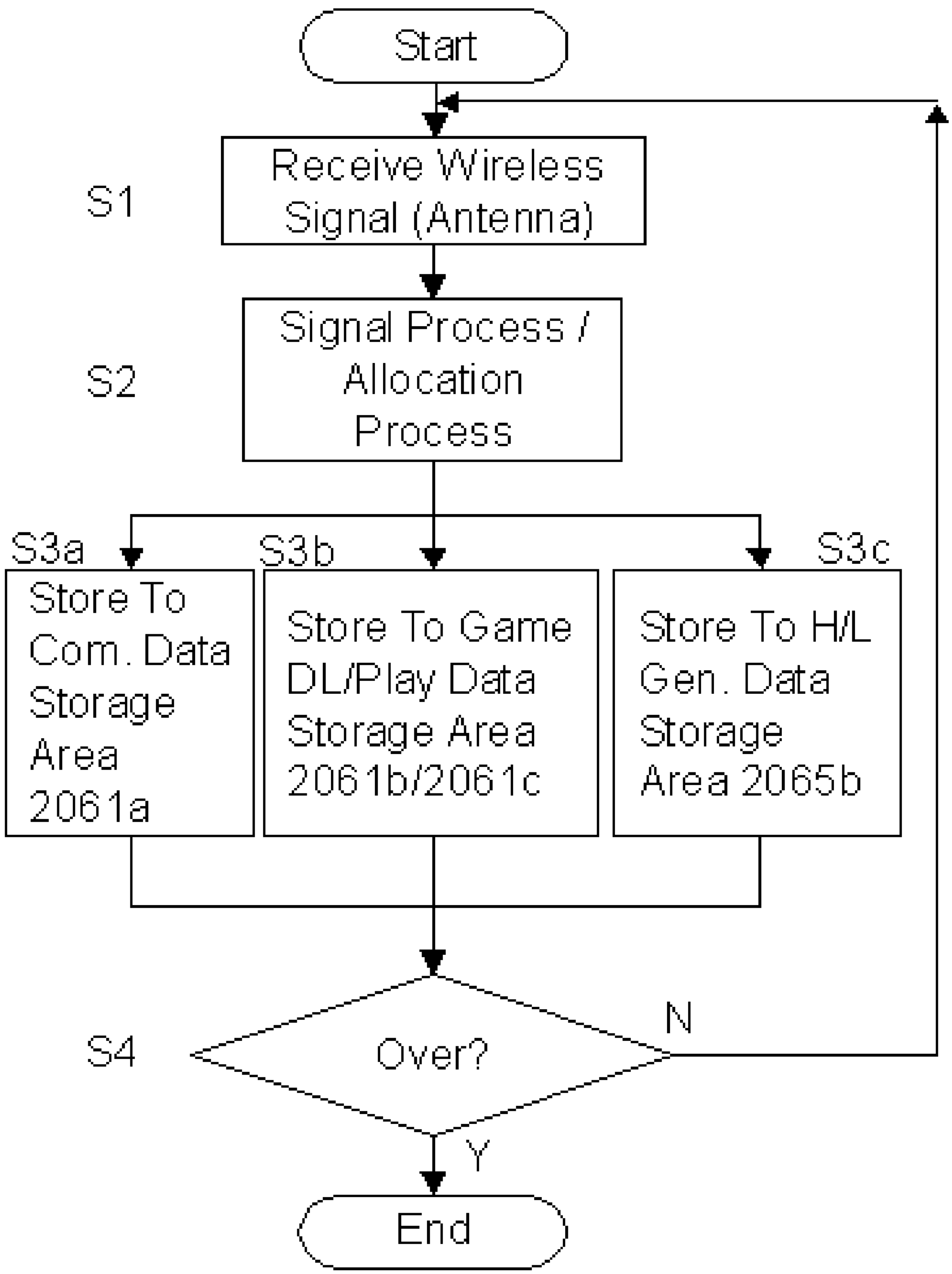

FIG. 181*c* is a flowchart illustrating an exemplary embodiment of the present invention.

Figure 181D:
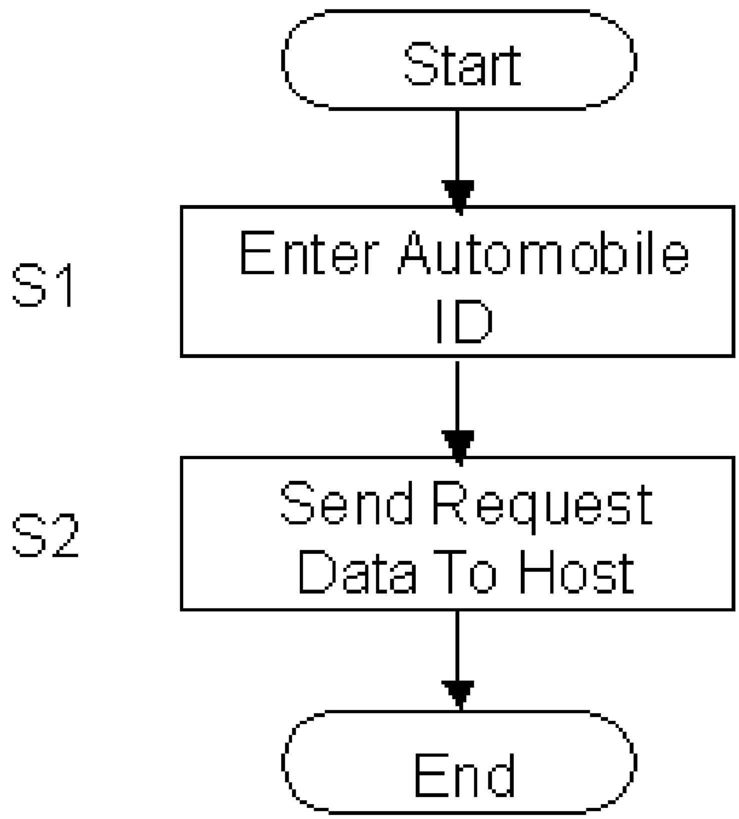

FIG. 181*d* is a flowchart illustrating an exemplary embodiment of the present invention.

Figure 181E:
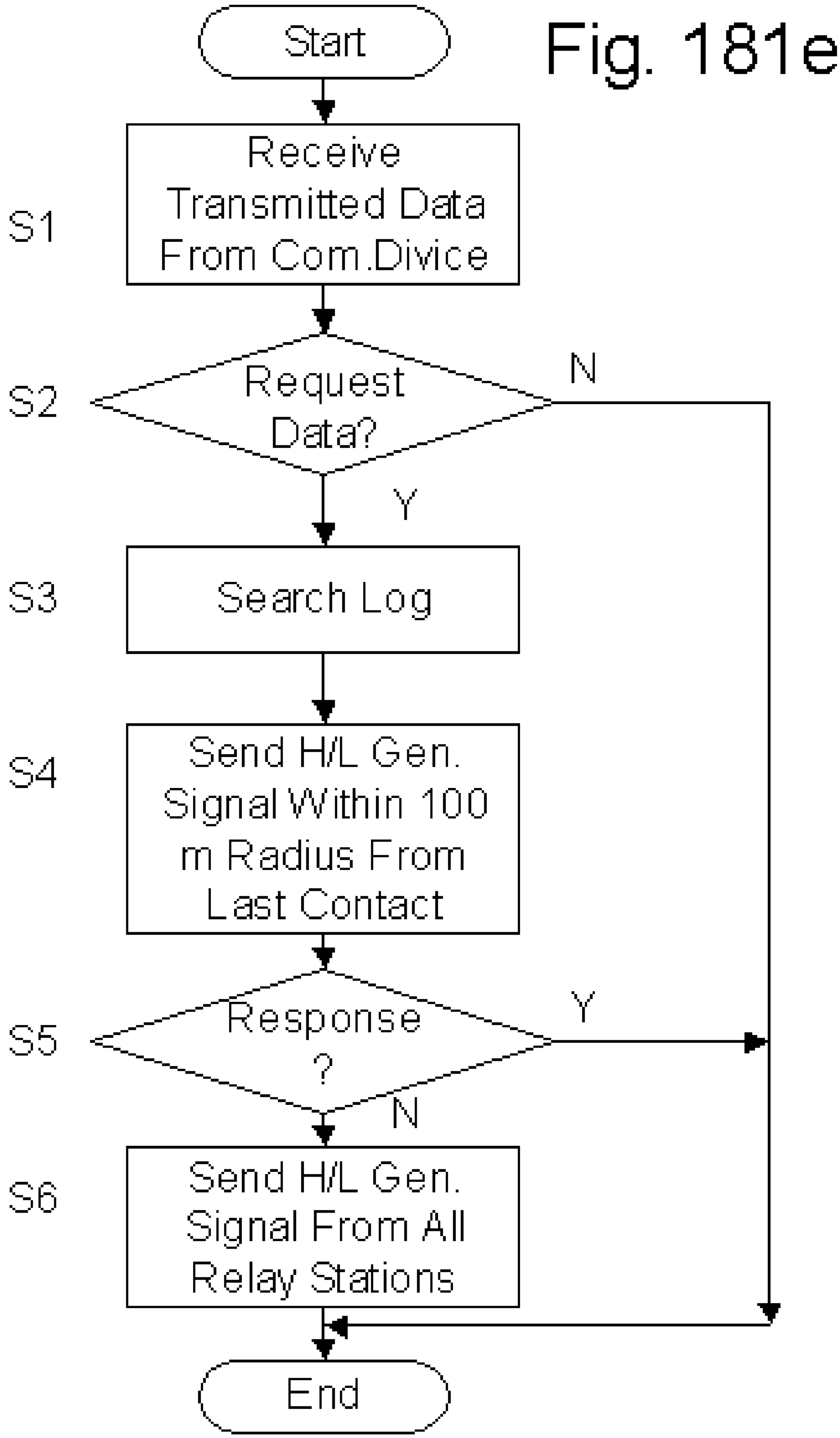

FIG. 181*e* is a flowchart illustrating an exemplary embodiment of the present invention.

Figure 182:
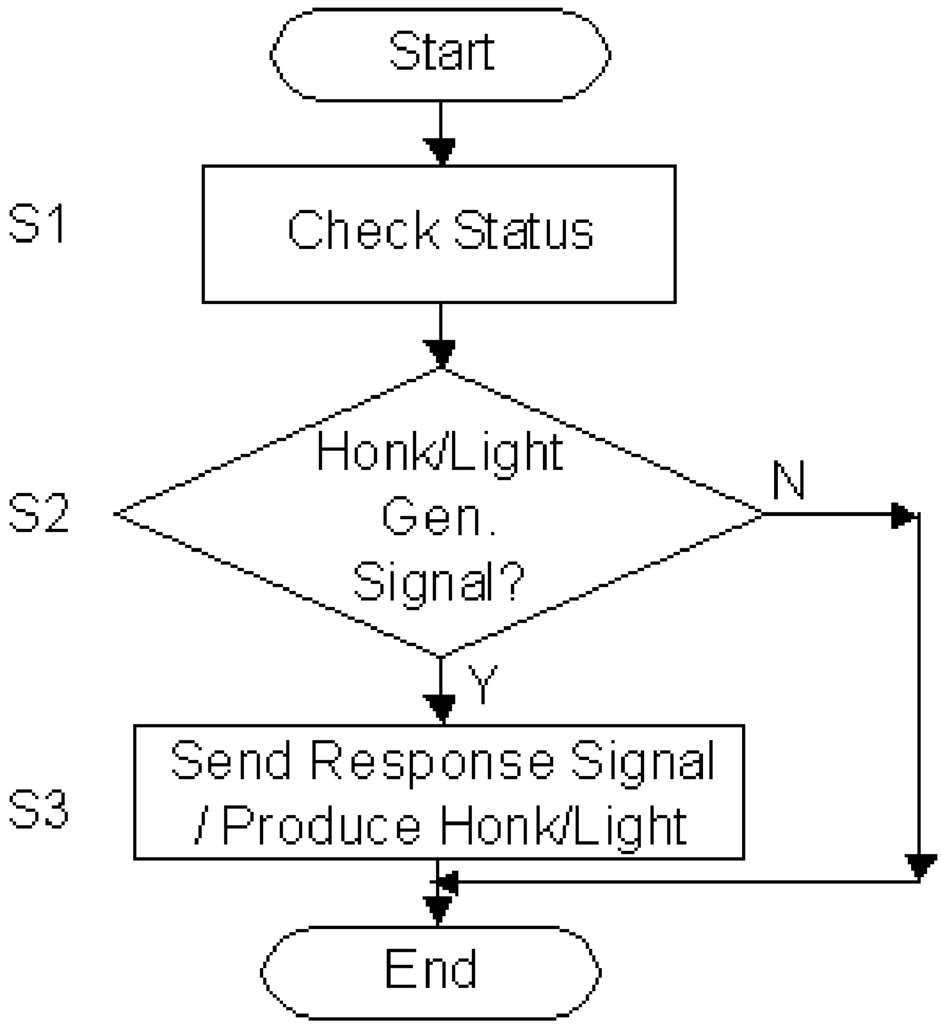

FIG. 182 is a flowchart illustrating an exemplary embodiment of the present invention.

Figure 183:
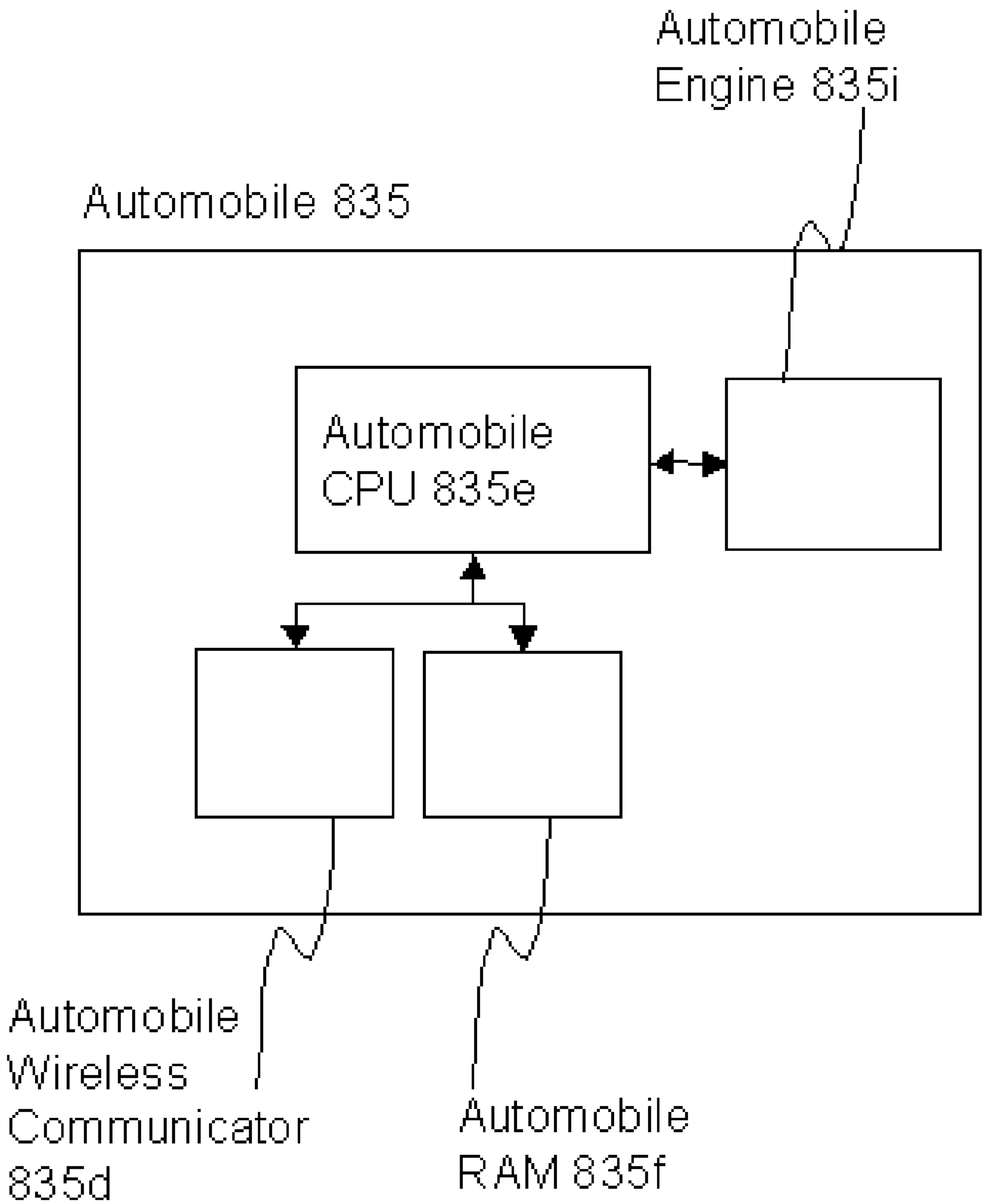

FIG. 183 is a block diagram illustrating an exemplary embodiment of the present invention.

Figure 184:
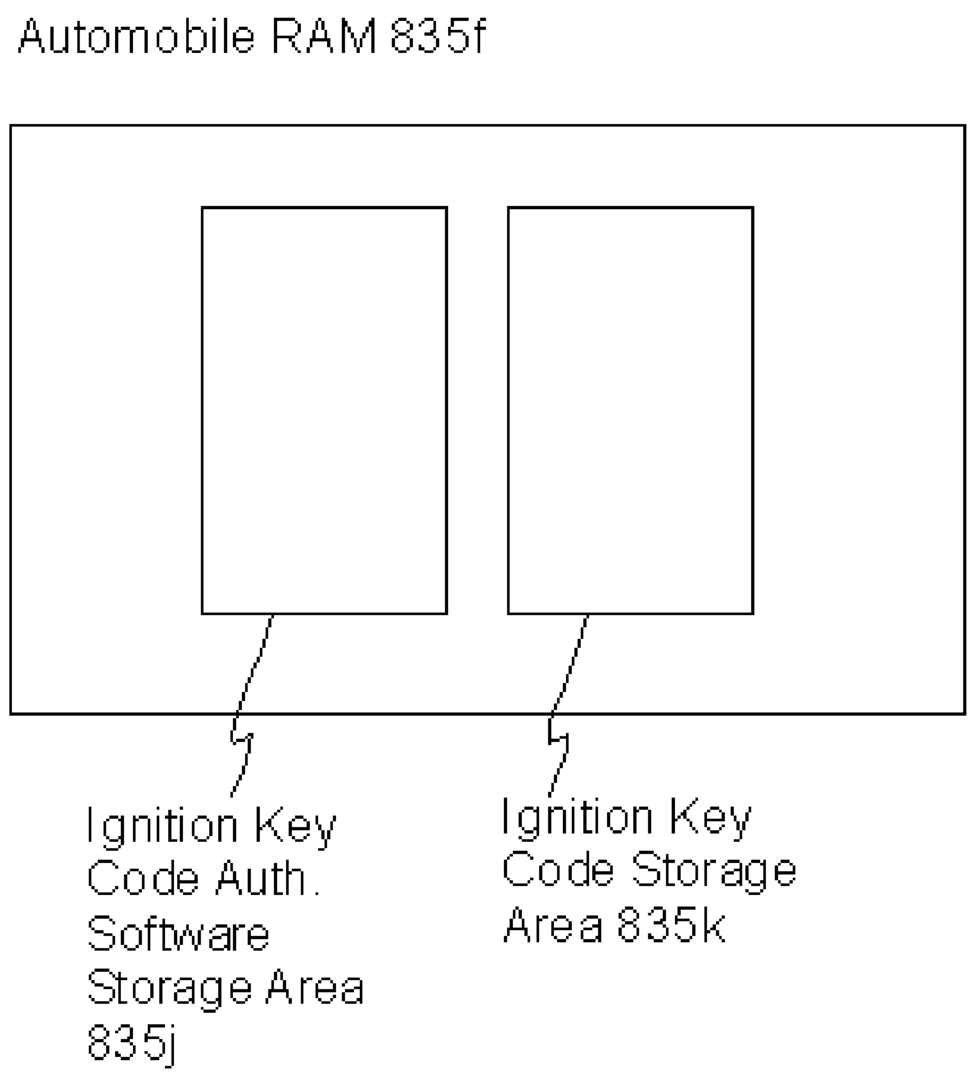

FIG. 184 is a block diagram illustrating an exemplary embodiment of the present invention.

Figure 185:
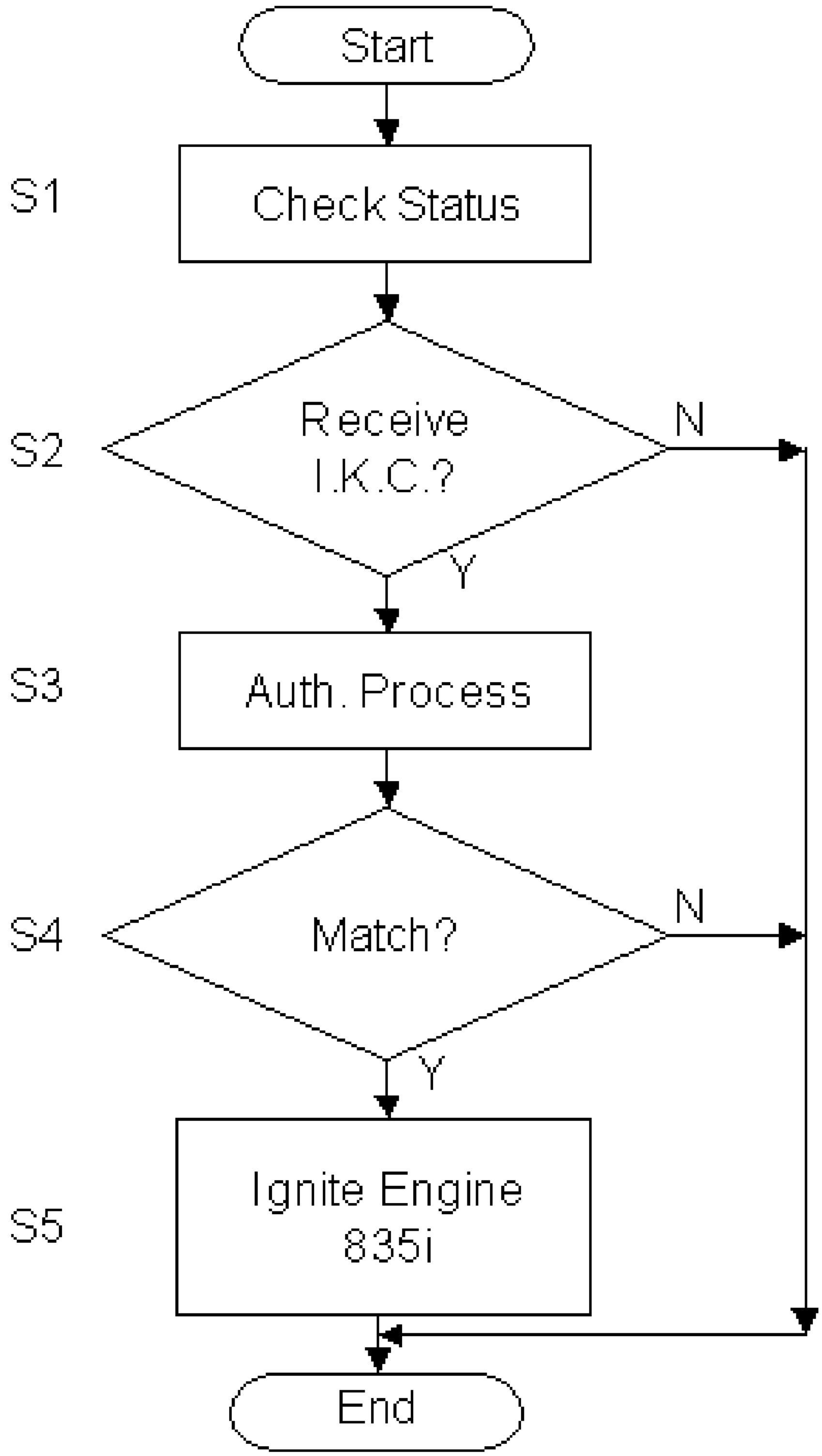

FIG. 185 is a flowchart illustrating an exemplary embodiment of the present invention.

Figure 186:
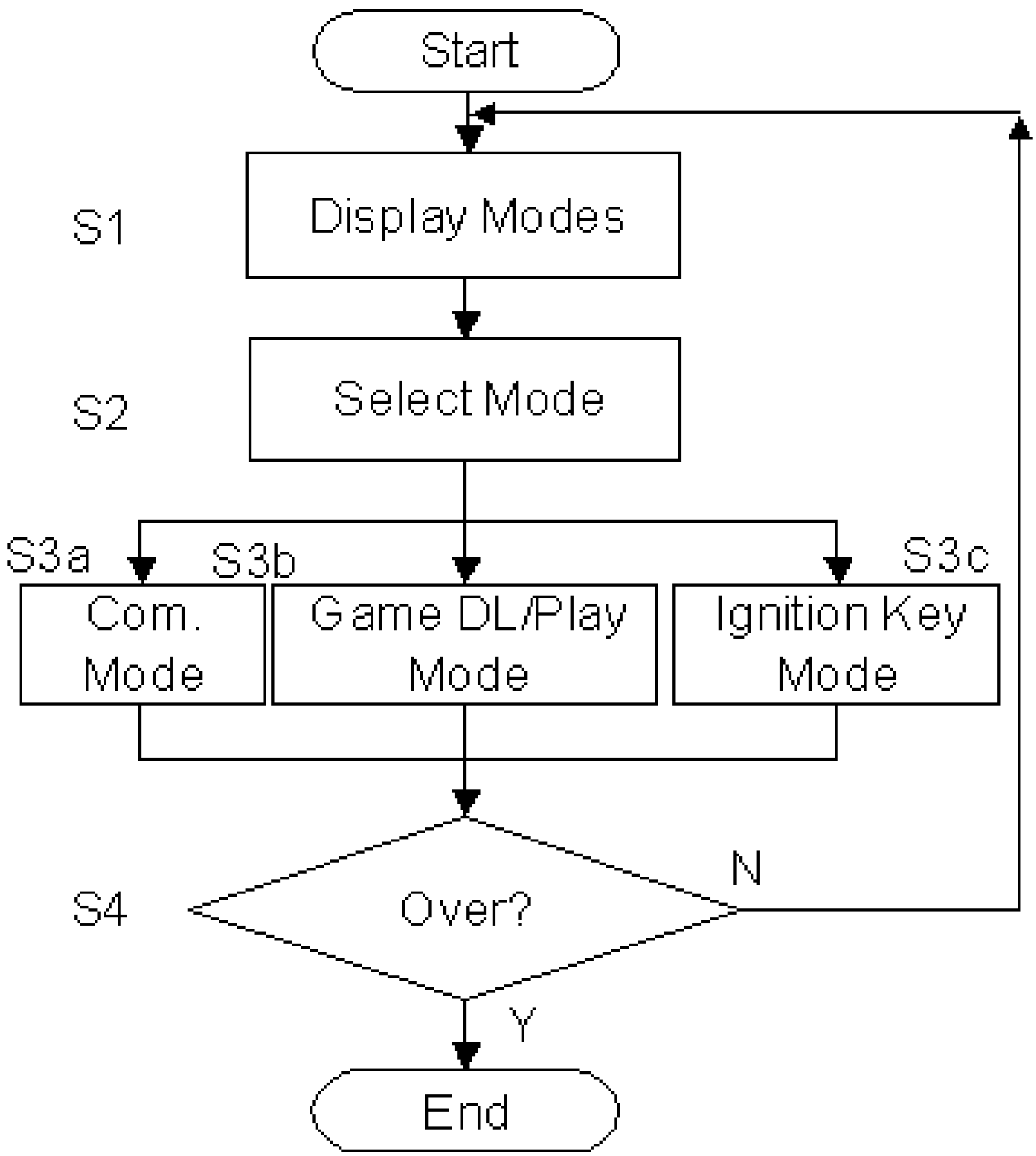

FIG. 186 is a flowchart illustrating an exemplary embodiment of the present invention.

Figure 187:
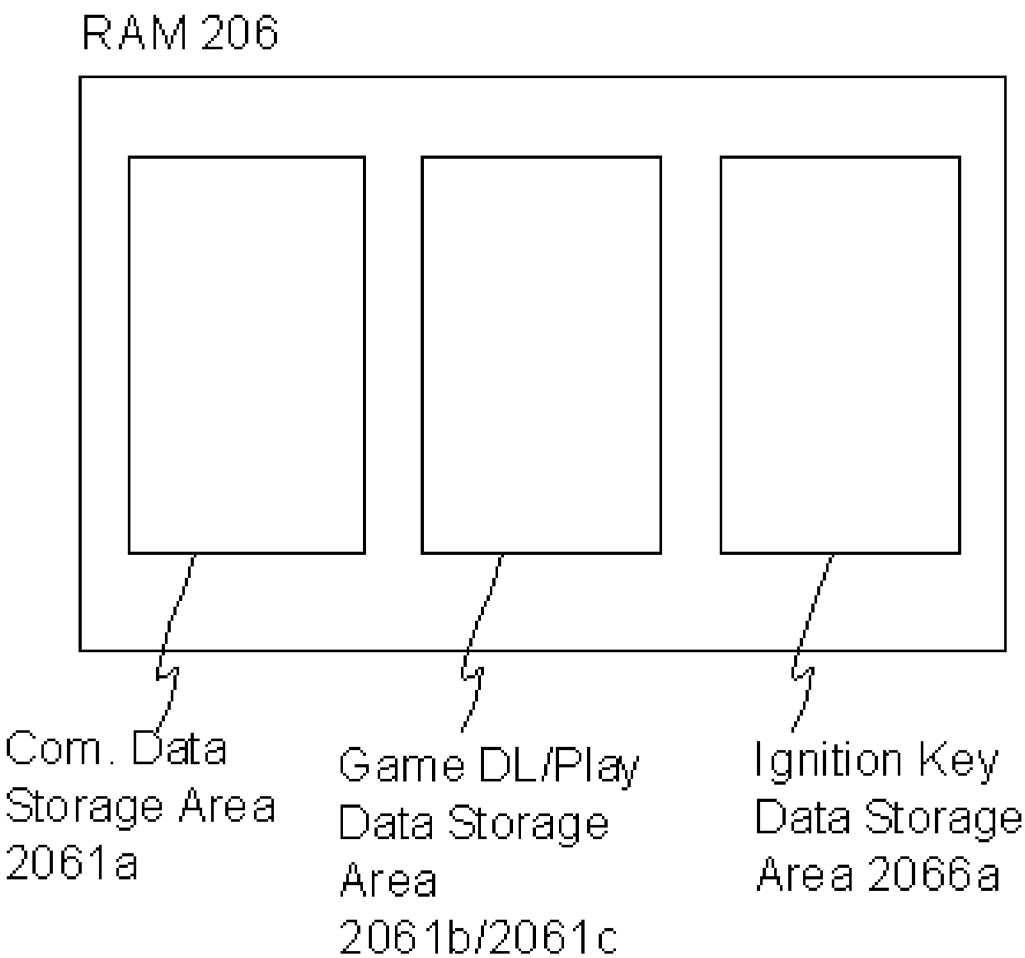

FIG. 187 is a block diagram illustrating an exemplary embodiment of the present invention.

Figure 188:
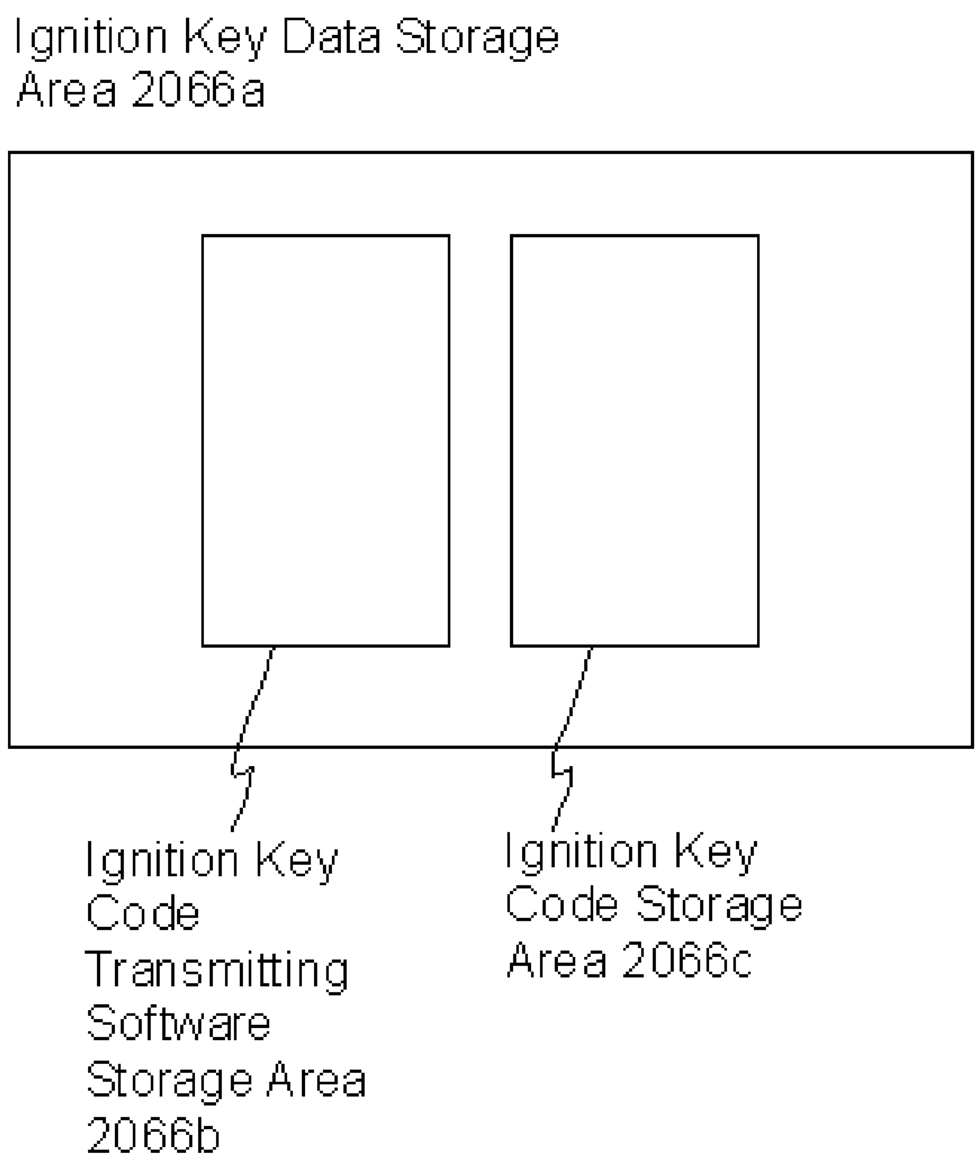

FIG. 188 is a block diagram illustrating an exemplary embodiment of the present invention.

Figure 188A:
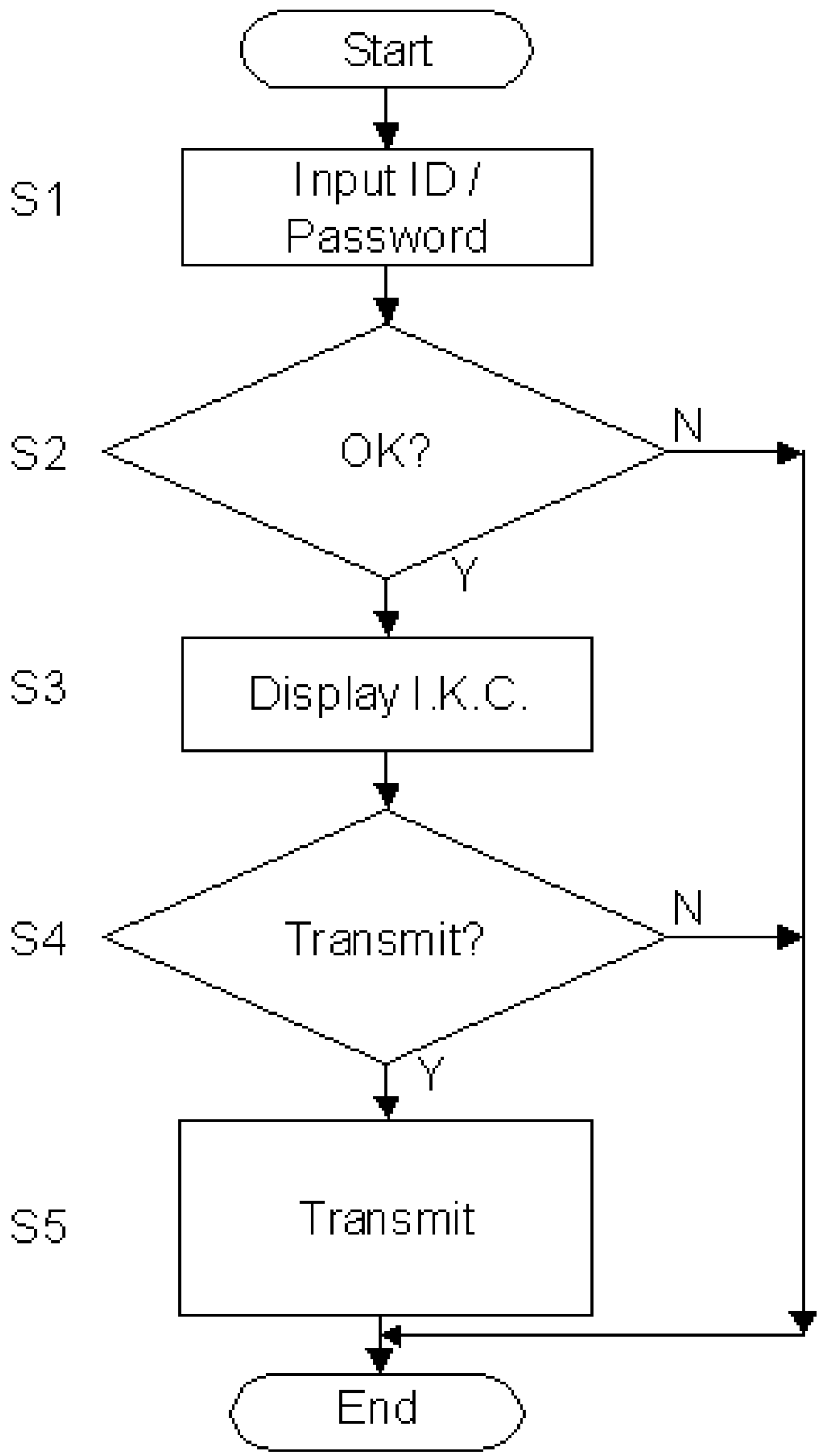

FIG. 188*a* is a flowchart illustrating an exemplary embodiment of the present invention.

Figure 189:
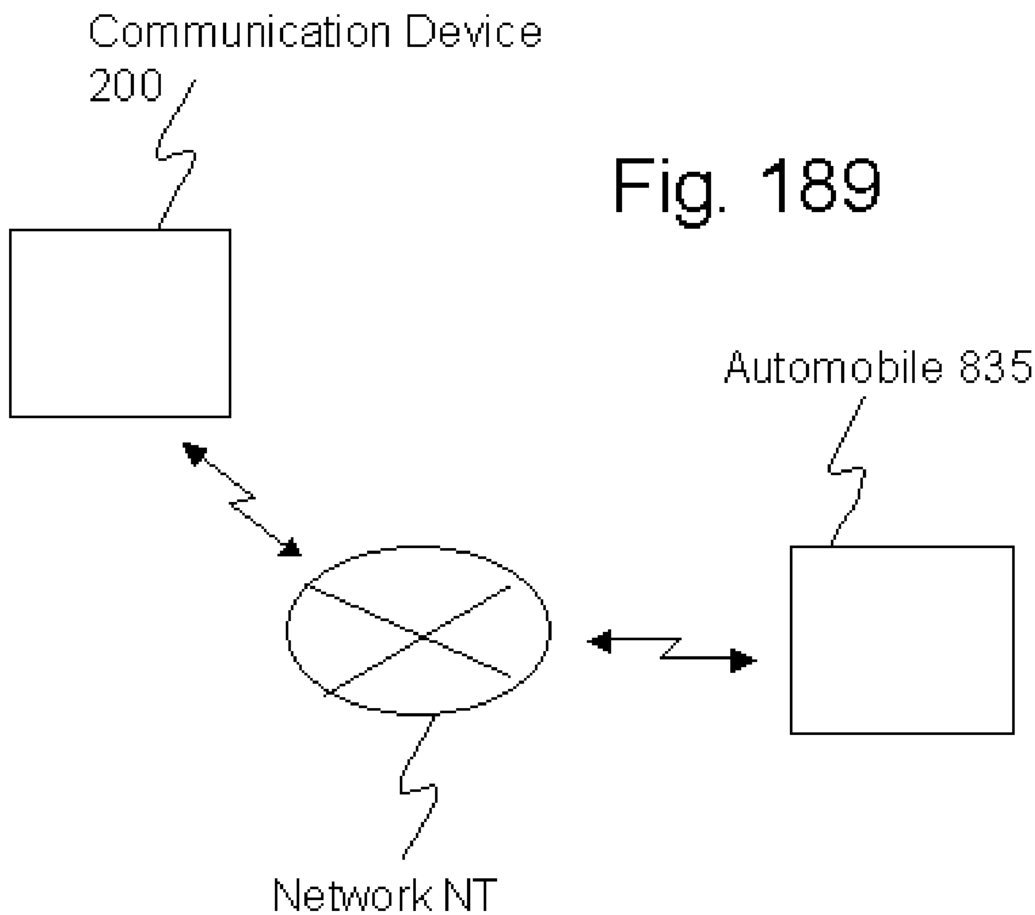

FIG. 189 is a simplified illustration illustrating an exemplary embodiment of the present invention.

Figure 190:
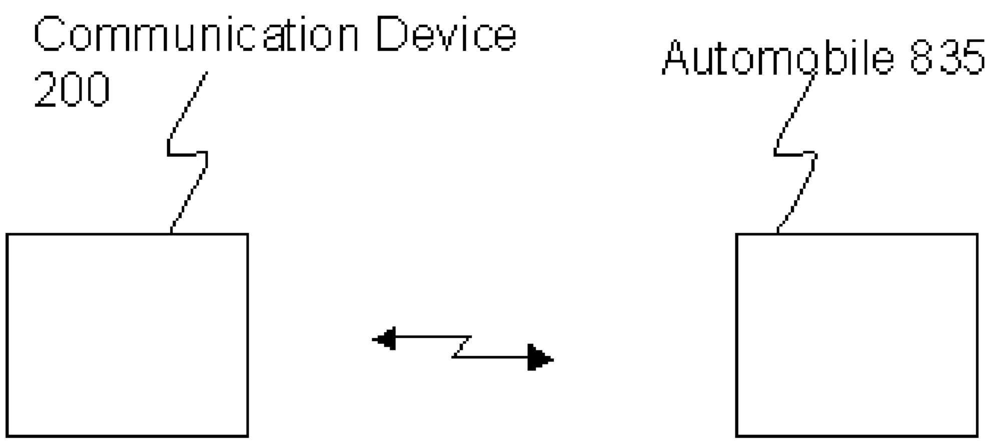

FIG. 190 is a simplified illustration illustrating an exemplary embodiment of the present invention.

Figure 191:
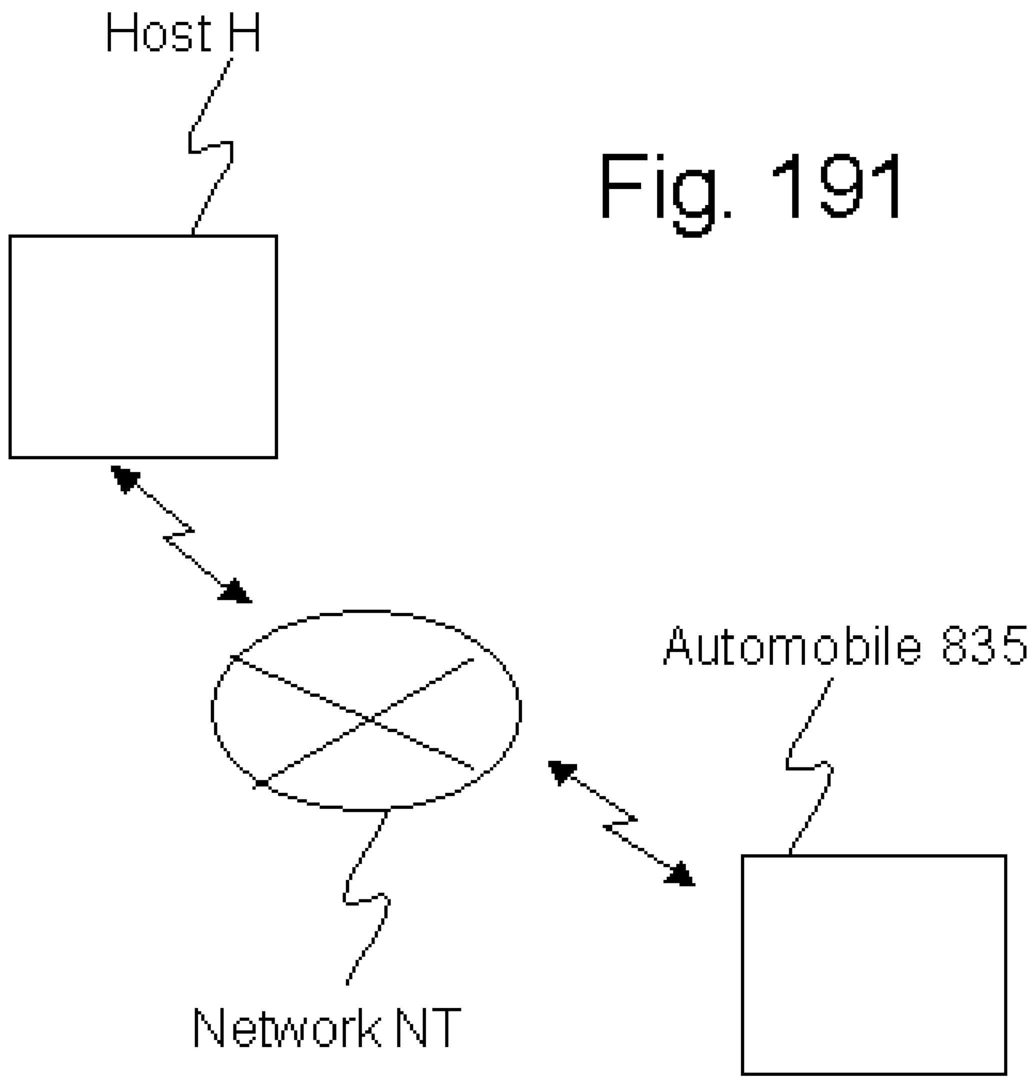

FIG. 191 is a simplified illustration illustrating an exemplary embodiment of the present invention.

Figure 192:
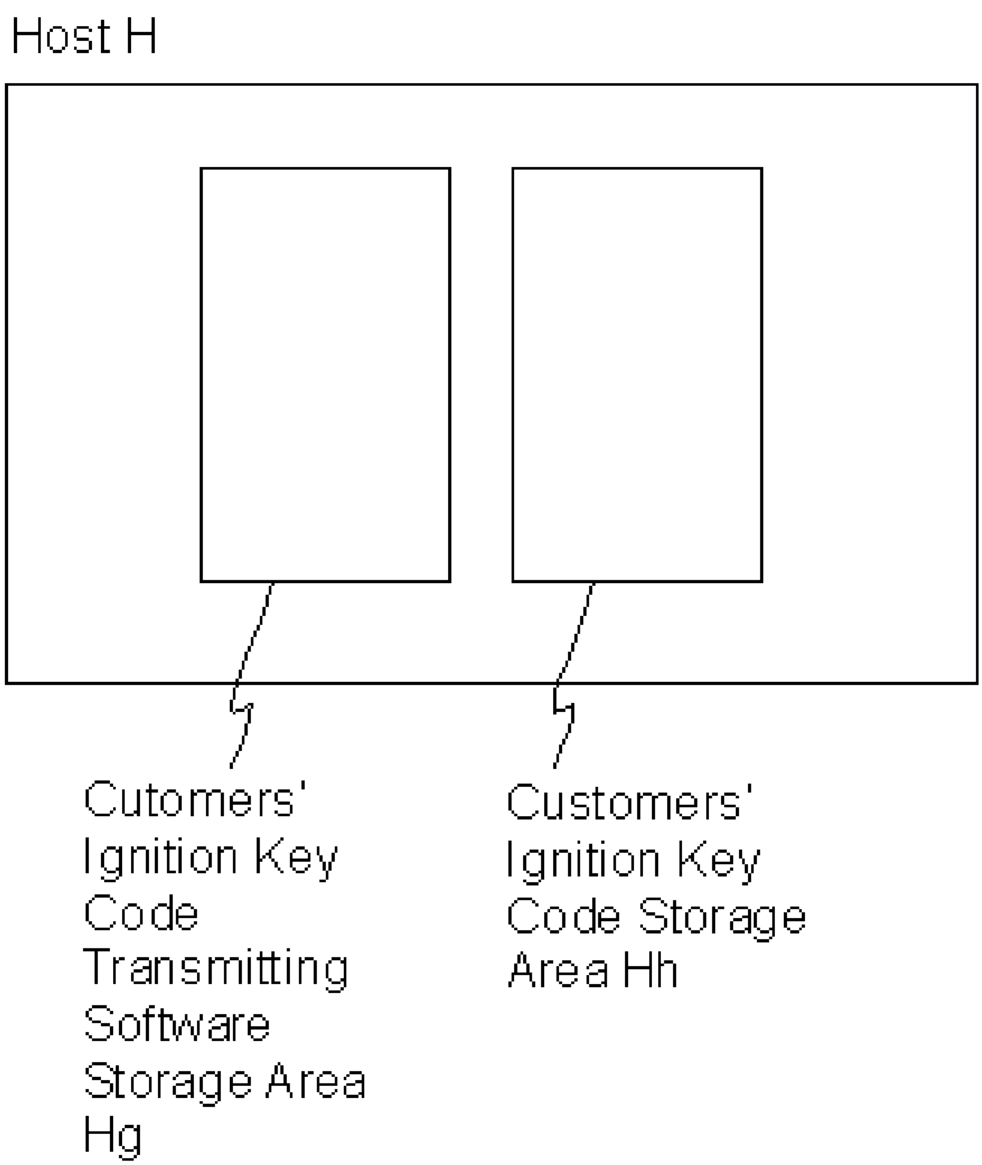

FIG. 192 is a block diagram illustrating an exemplary embodiment of the present invention.

FIG. 193 is a block diagram illustrating an exemplary embodiment of the present invention.

Figure 194:
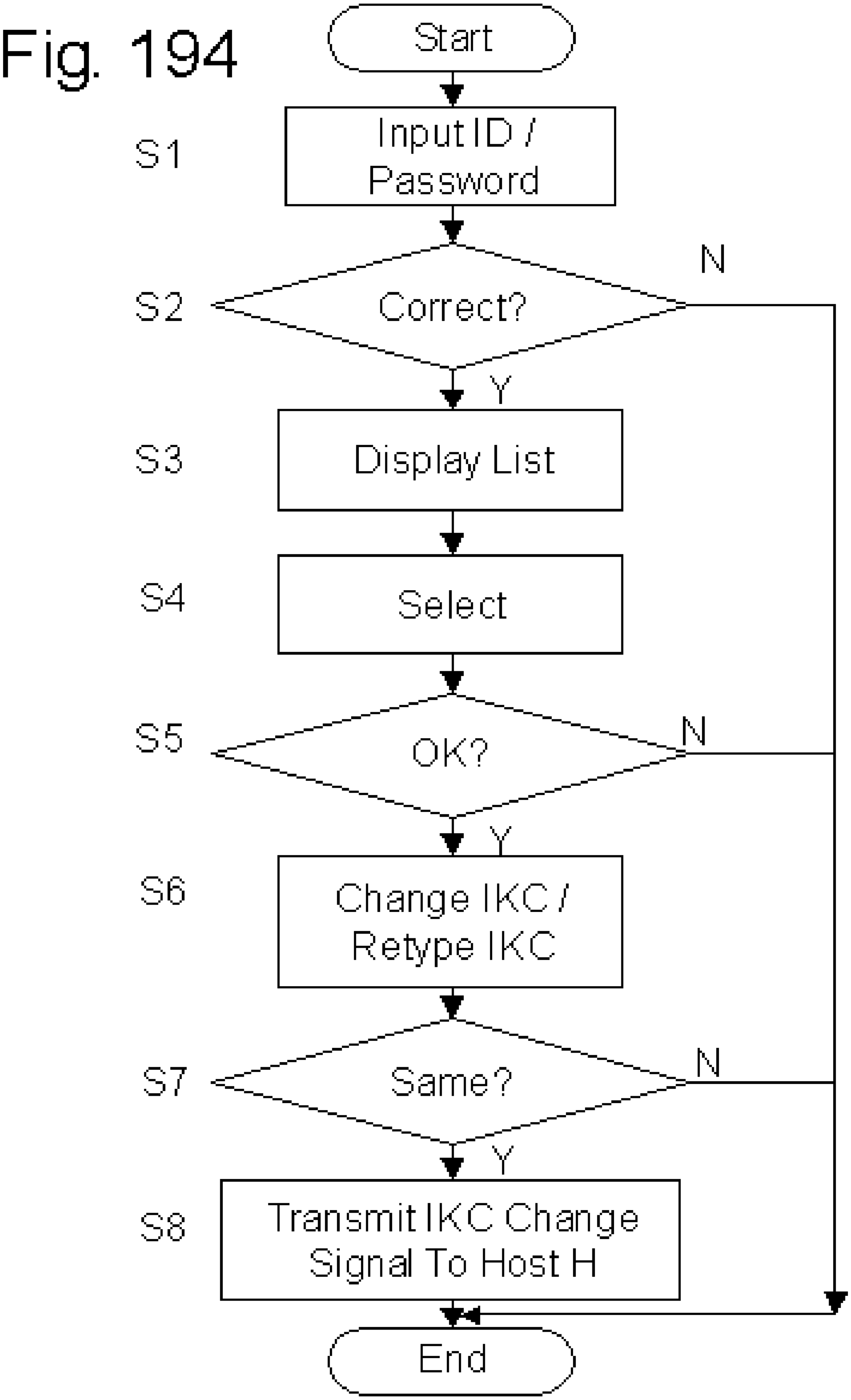

FIG. 194 is a flowchart illustrating an exemplary embodiment of the present invention.

Figure 195:
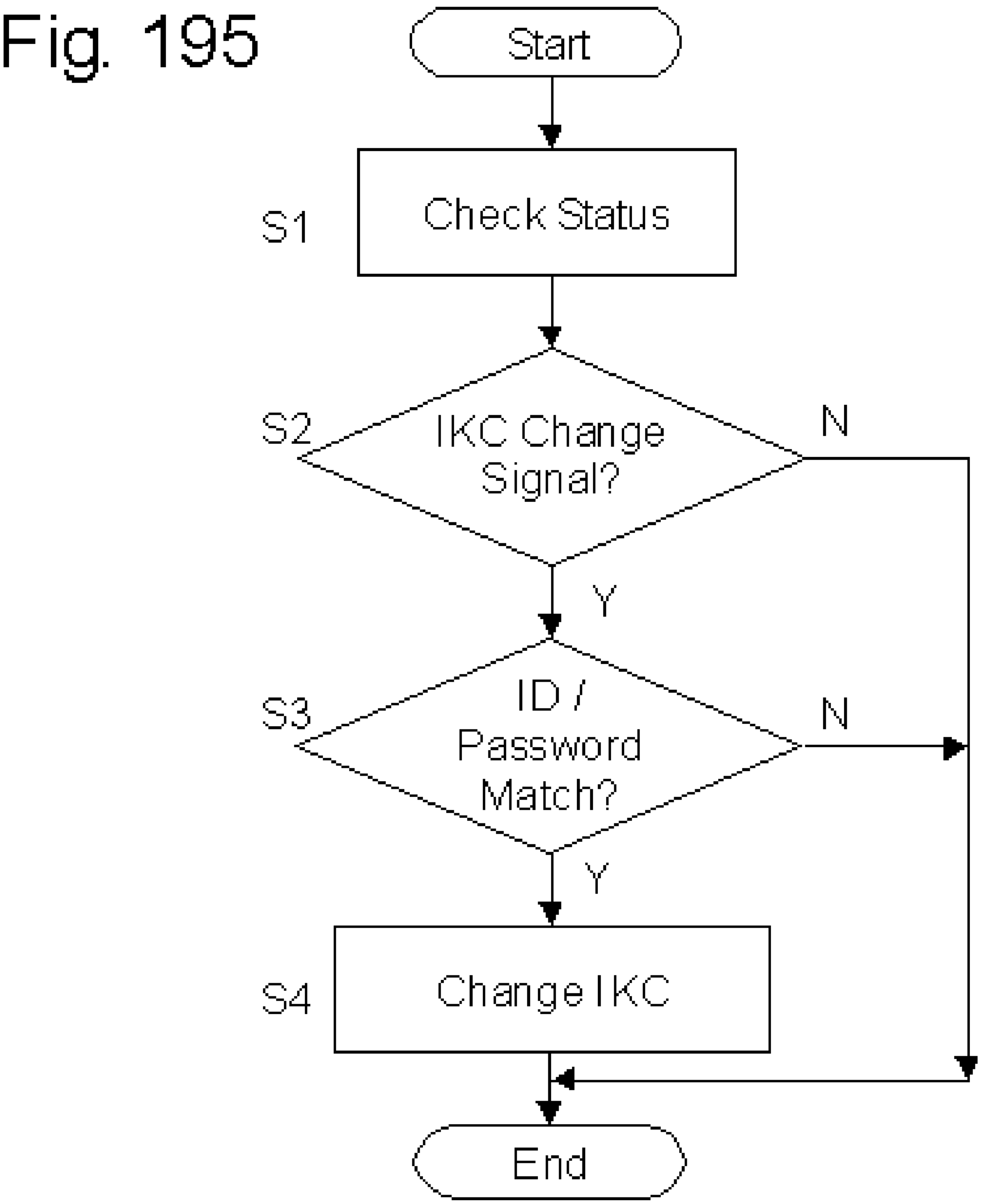

FIG. 195 is a flowchart illustrating an exemplary embodiment of the present invention.

Figure 196:
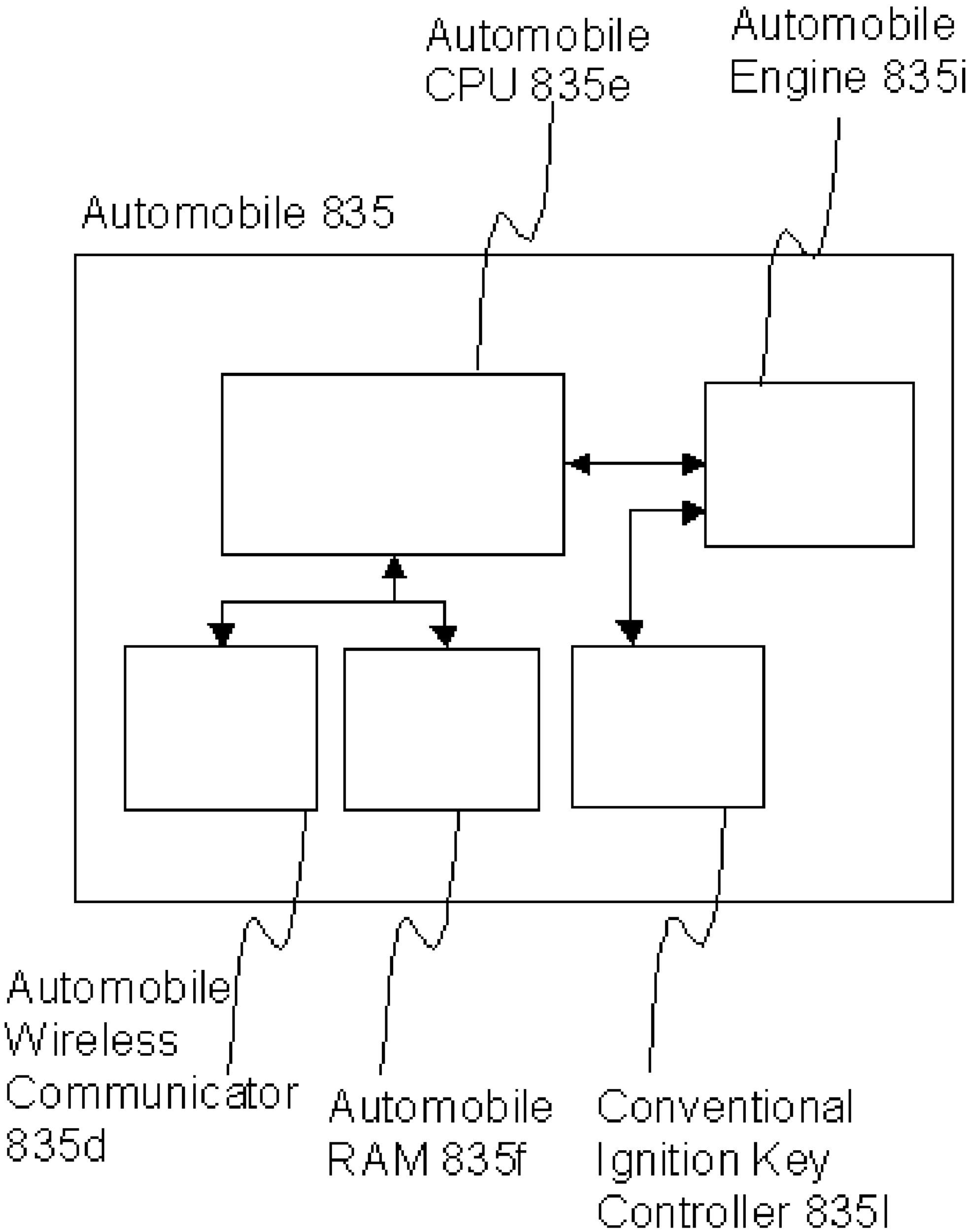

FIG. 196 is a block diagram illustrating an exemplary embodiment of the present invention.

FIG. 197 is a block diagram illustrating an exemplary embodiment of the present invention.

Figure 198:
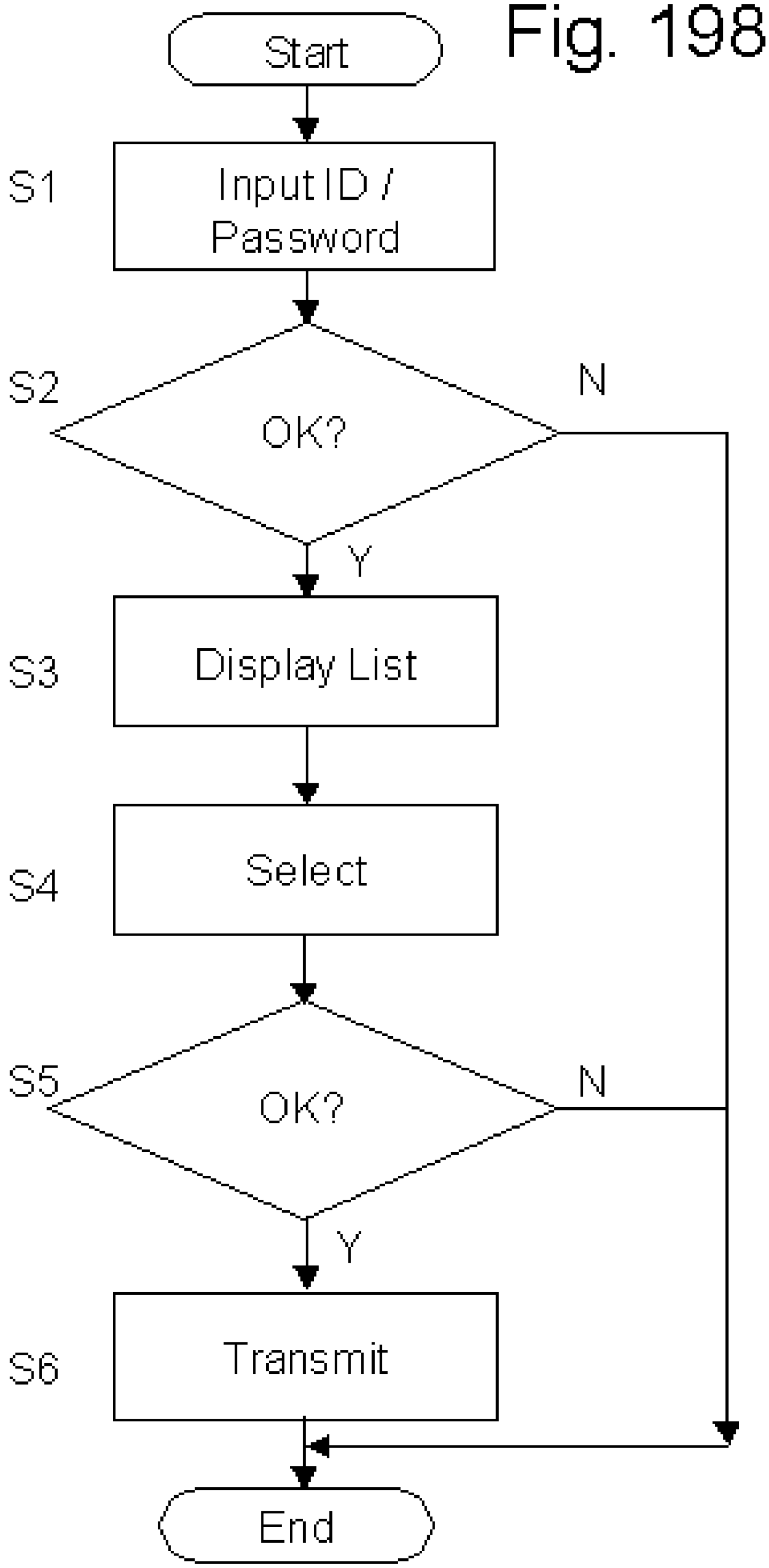

FIG. 198 is a flowchart illustrating an exemplary embodiment of the present invention.

FIG. 199 is a block diagram illustrating an exemplary embodiment of the present invention.

Figure 200:
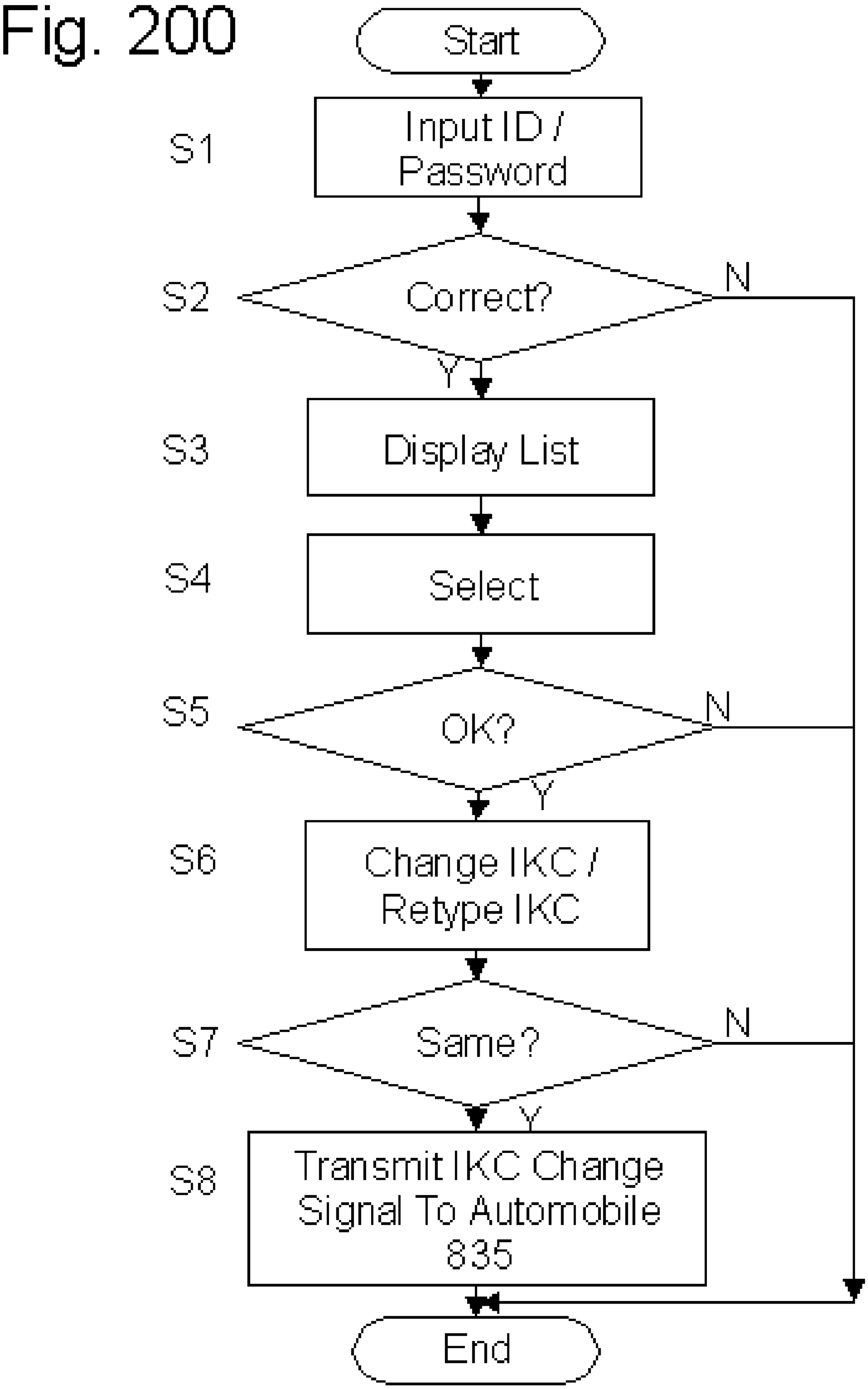

FIG. 200 is a flowchart illustrating an exemplary embodiment of the present invention.

Figure 201:
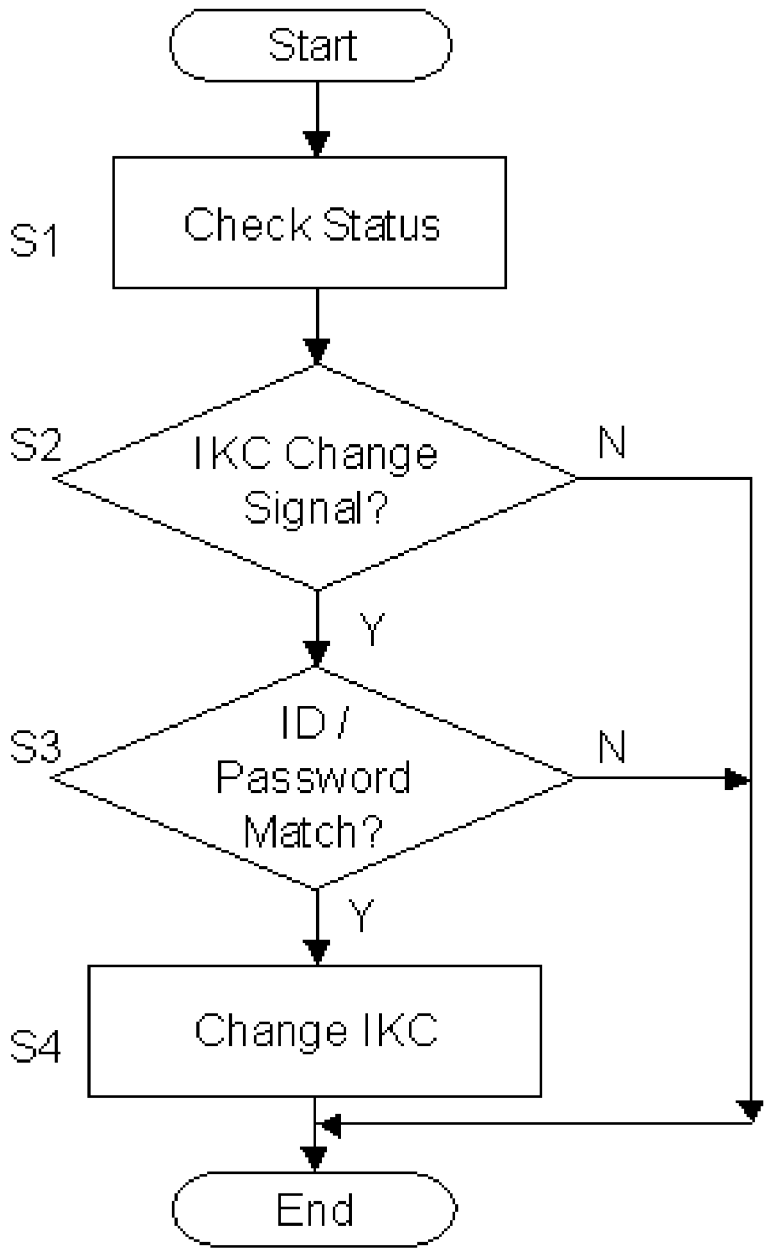

FIG. 201 is a flowchart illustrating an exemplary embodiment of the present invention.

Figure 202:
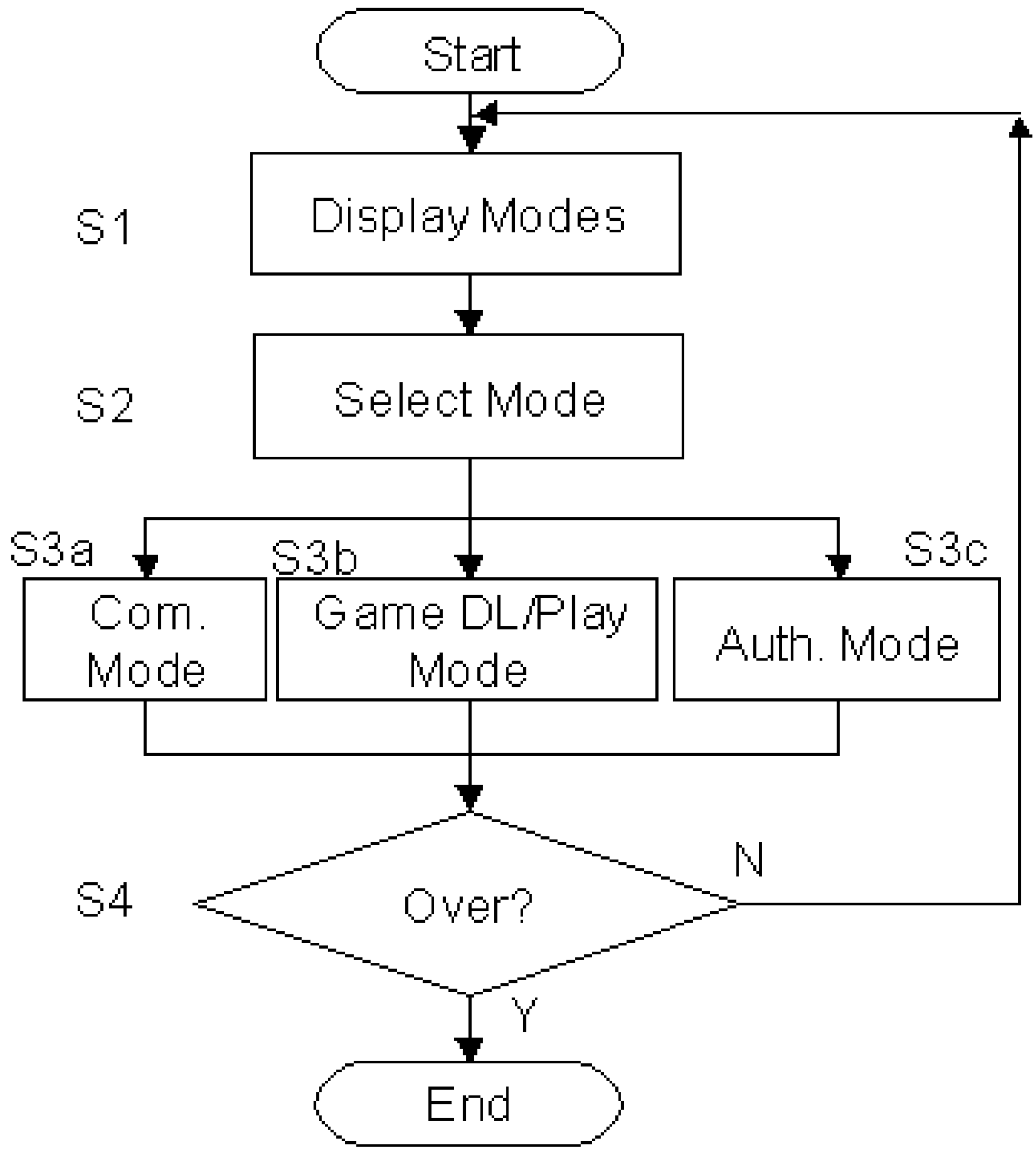

FIG. 202 is a block diagram illustrating an exemplary embodiment of the present invention.

Figure 203:
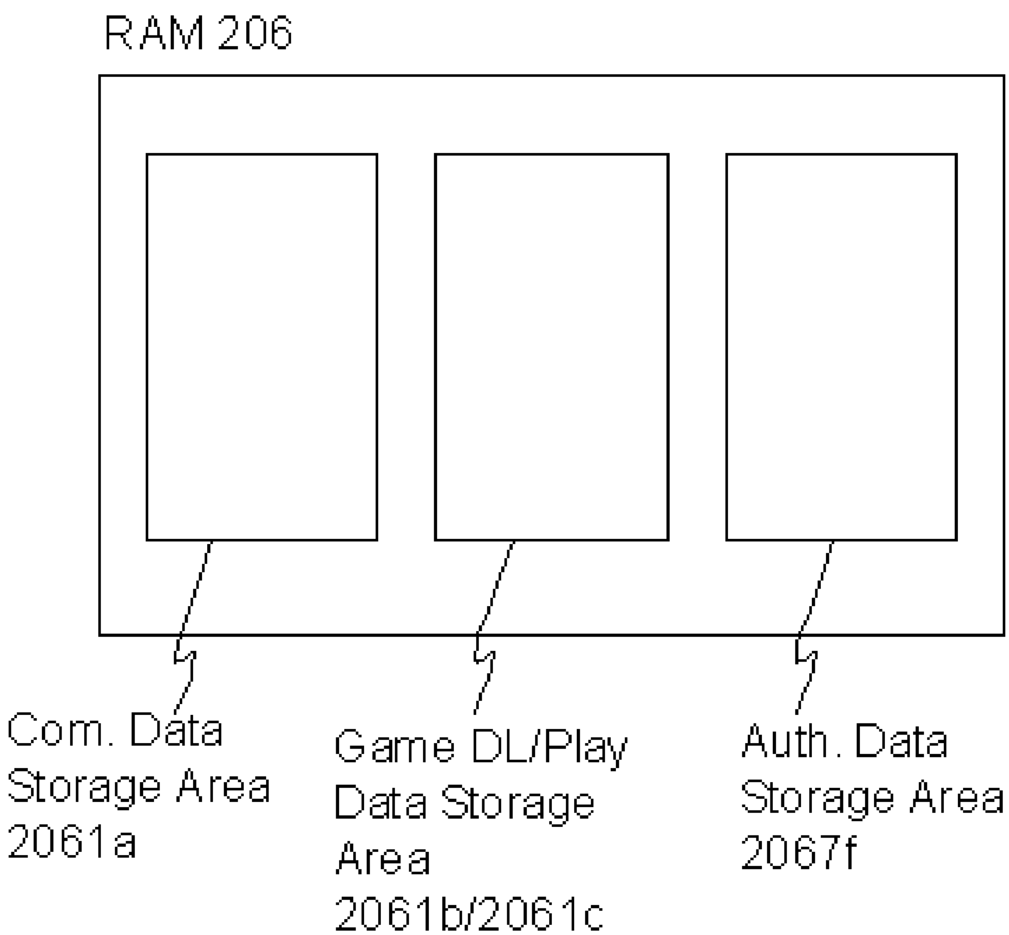

FIG. 203 is a flowchart illustrating an exemplary embodiment of the present invention.

Figure 204:
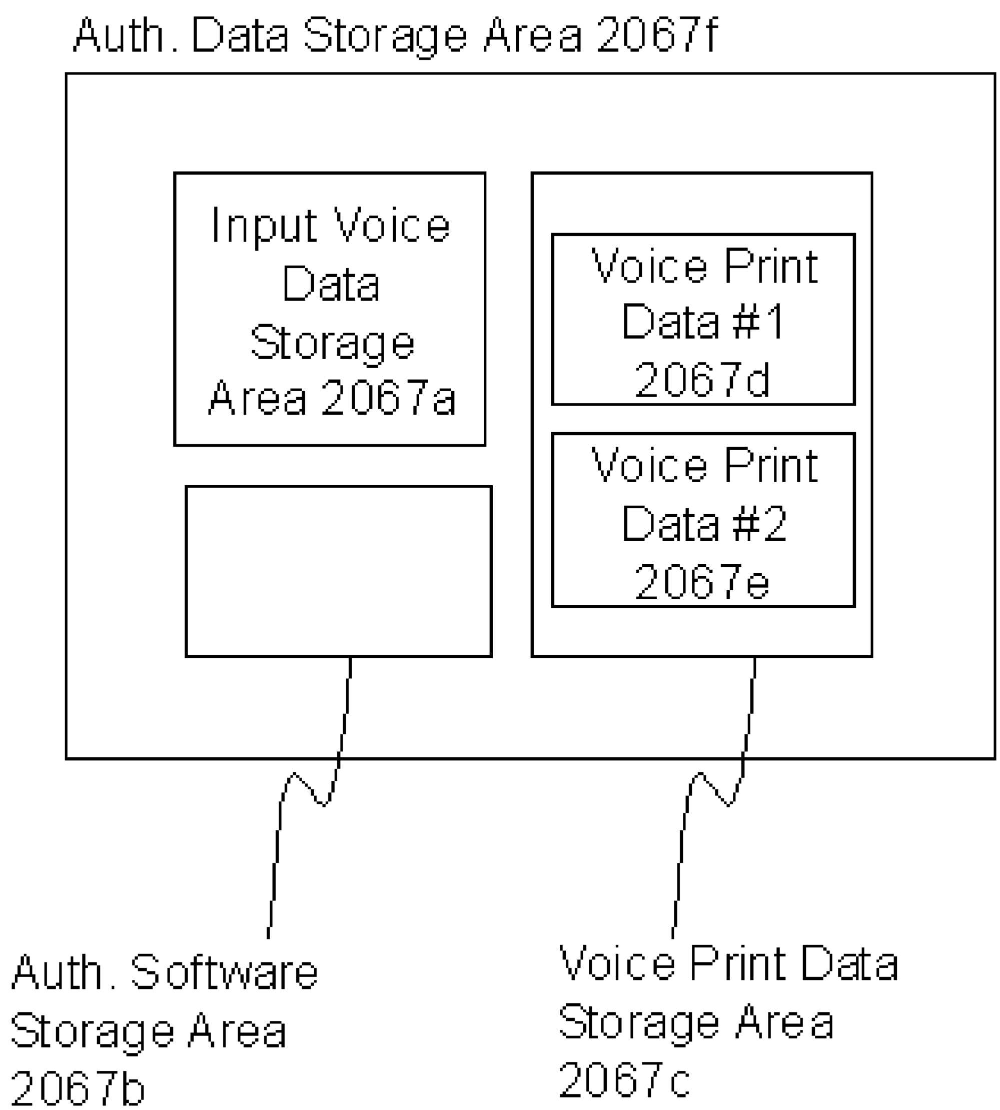

FIG. 204 is a flowchart illustrating an exemplary embodiment of the present invention.

Figure 205:
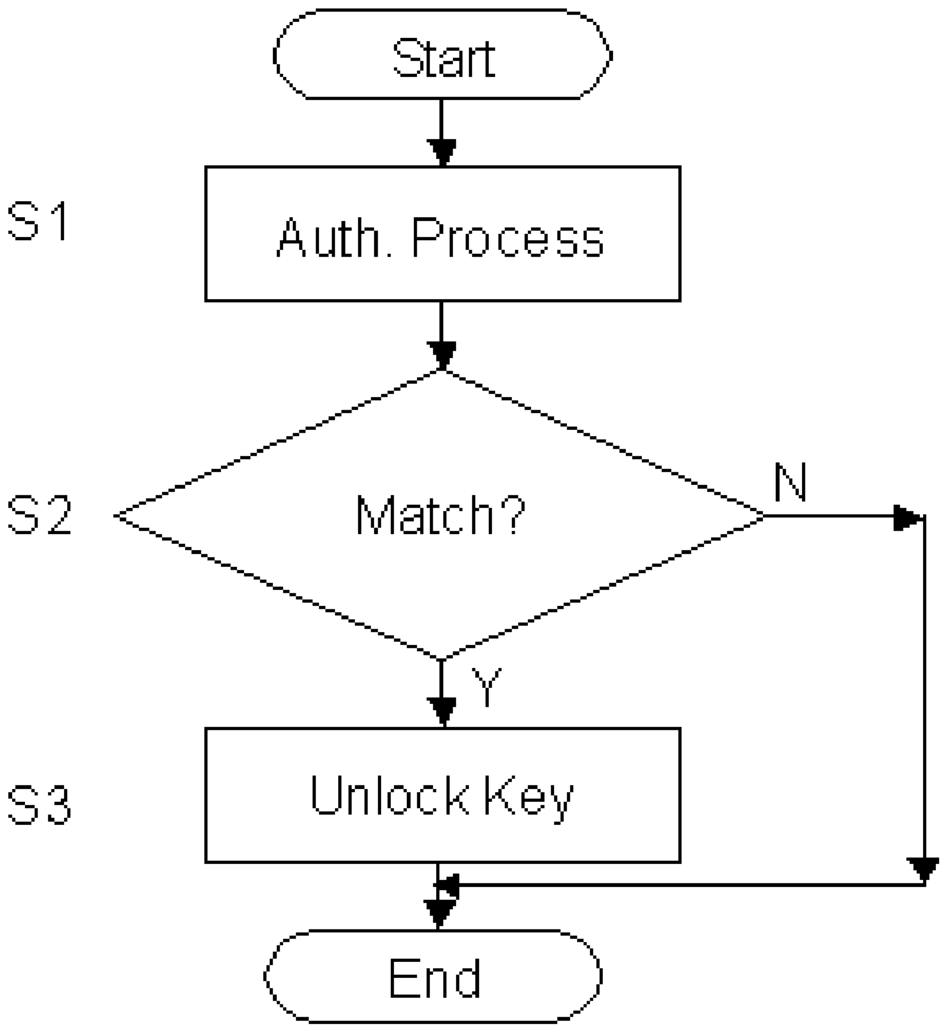

FIG. 205 is a flowchart illustrating an exemplary embodiment of the present invention.

Figure 206:
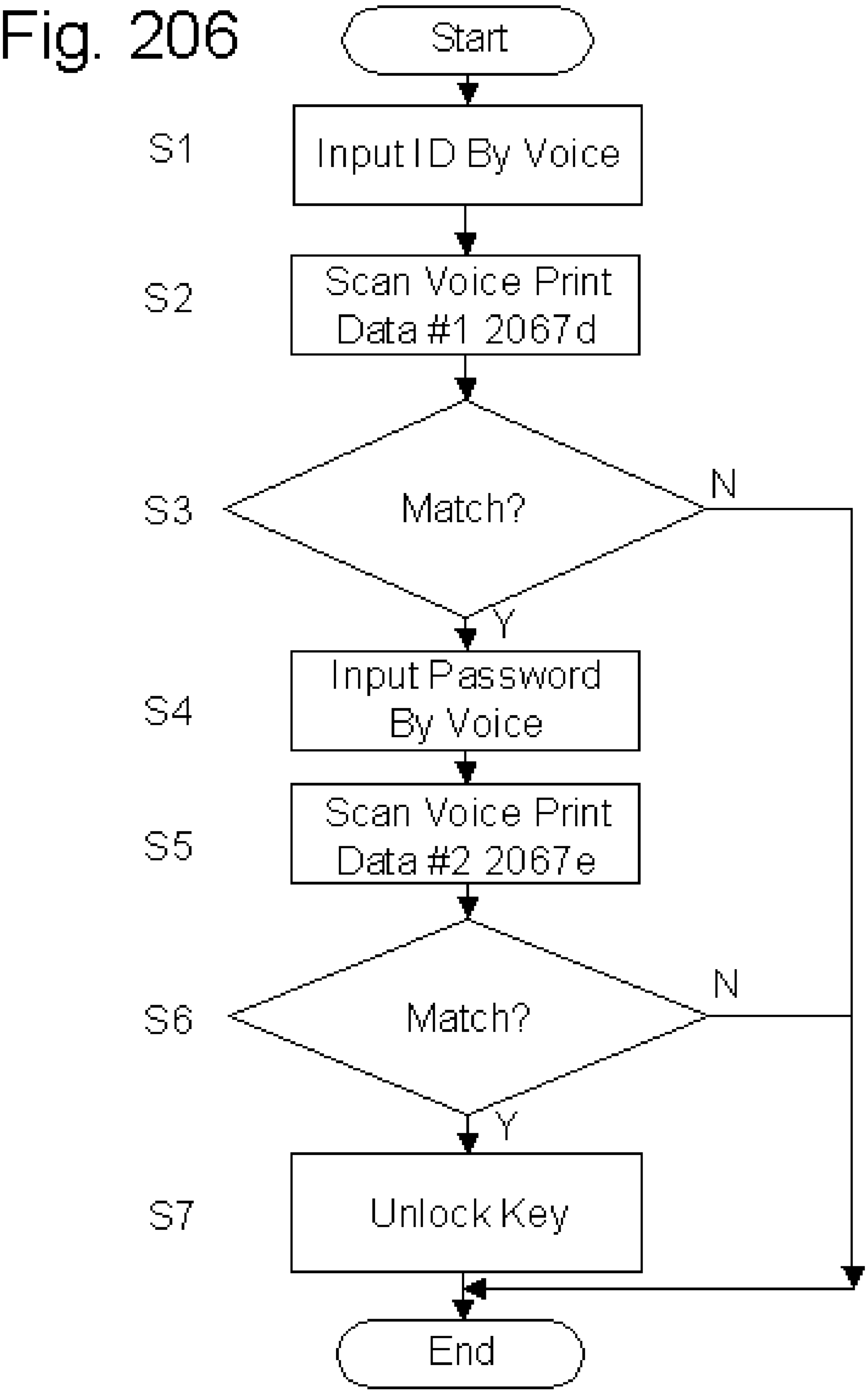

FIG. 206 is a block diagram illustrating an exemplary embodiment of the present invention.

Figure 207:
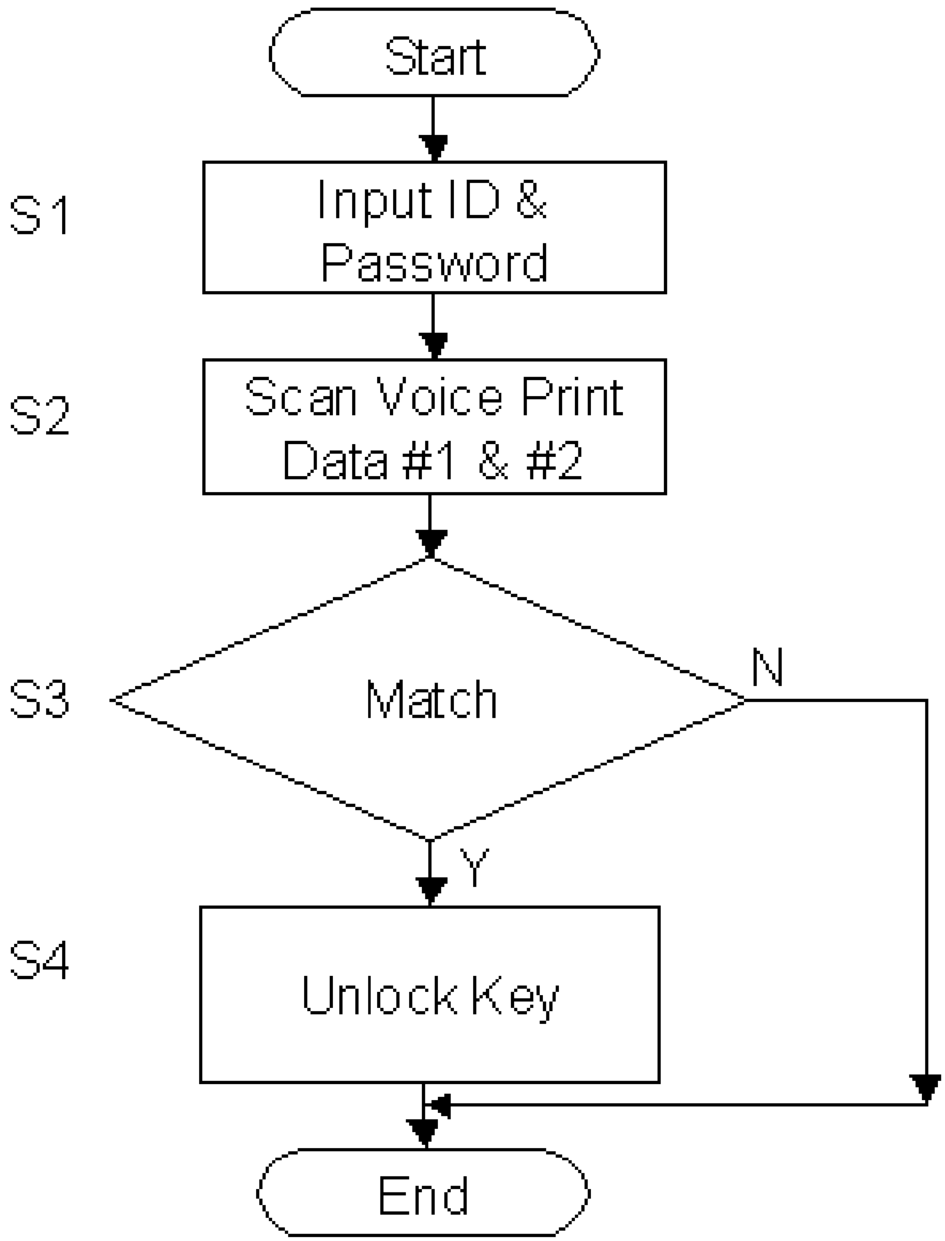

FIG. 207 is a flowchart illustrating an exemplary embodiment of the present invention.

Figure 208:
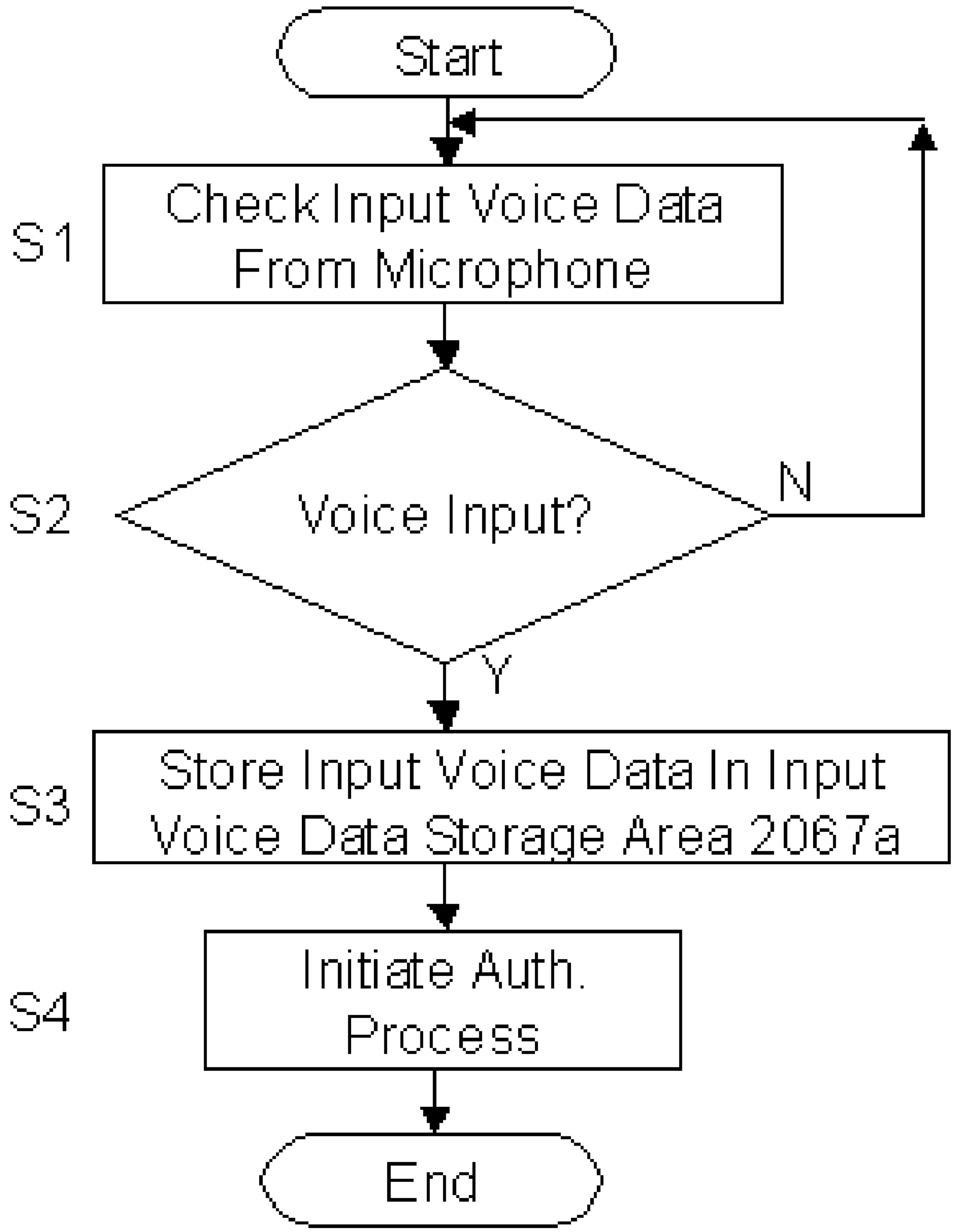

FIG. 208 is a flowchart illustrating an exemplary embodiment of the present invention.

Figure 209:
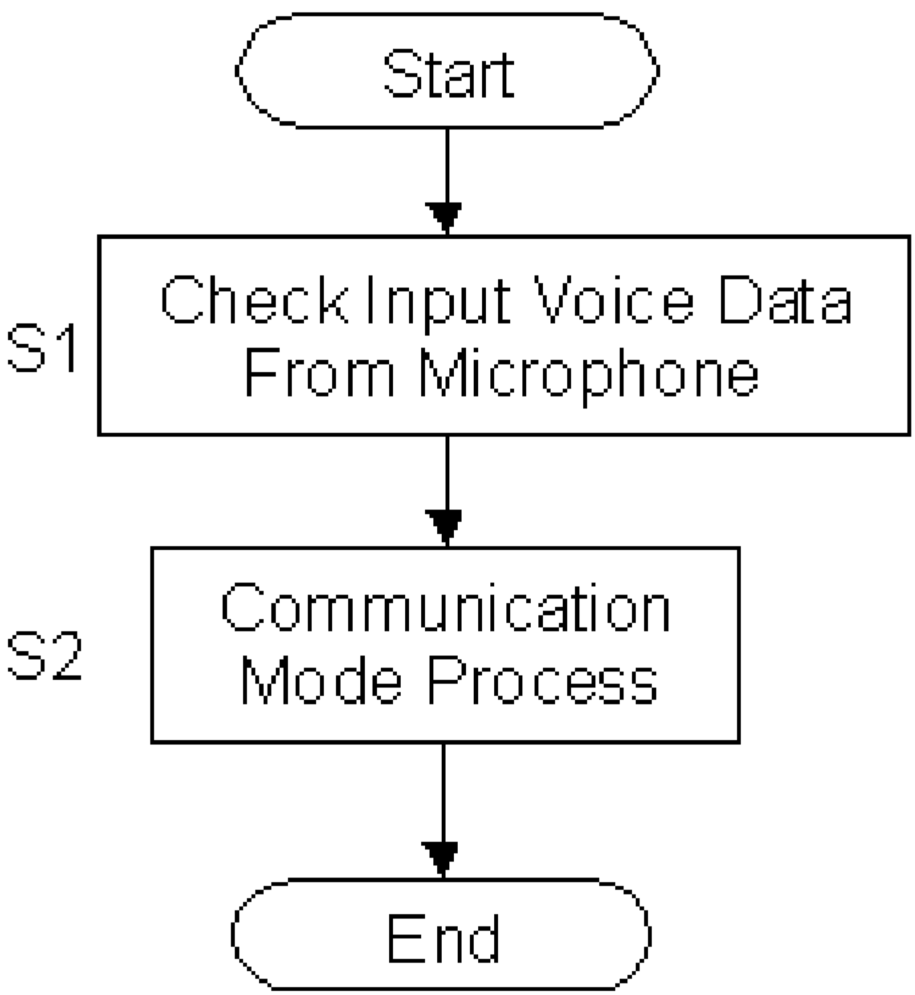

FIG. 209 is a flowchart illustrating an exemplary embodiment of the present invention.

Figure 210A:
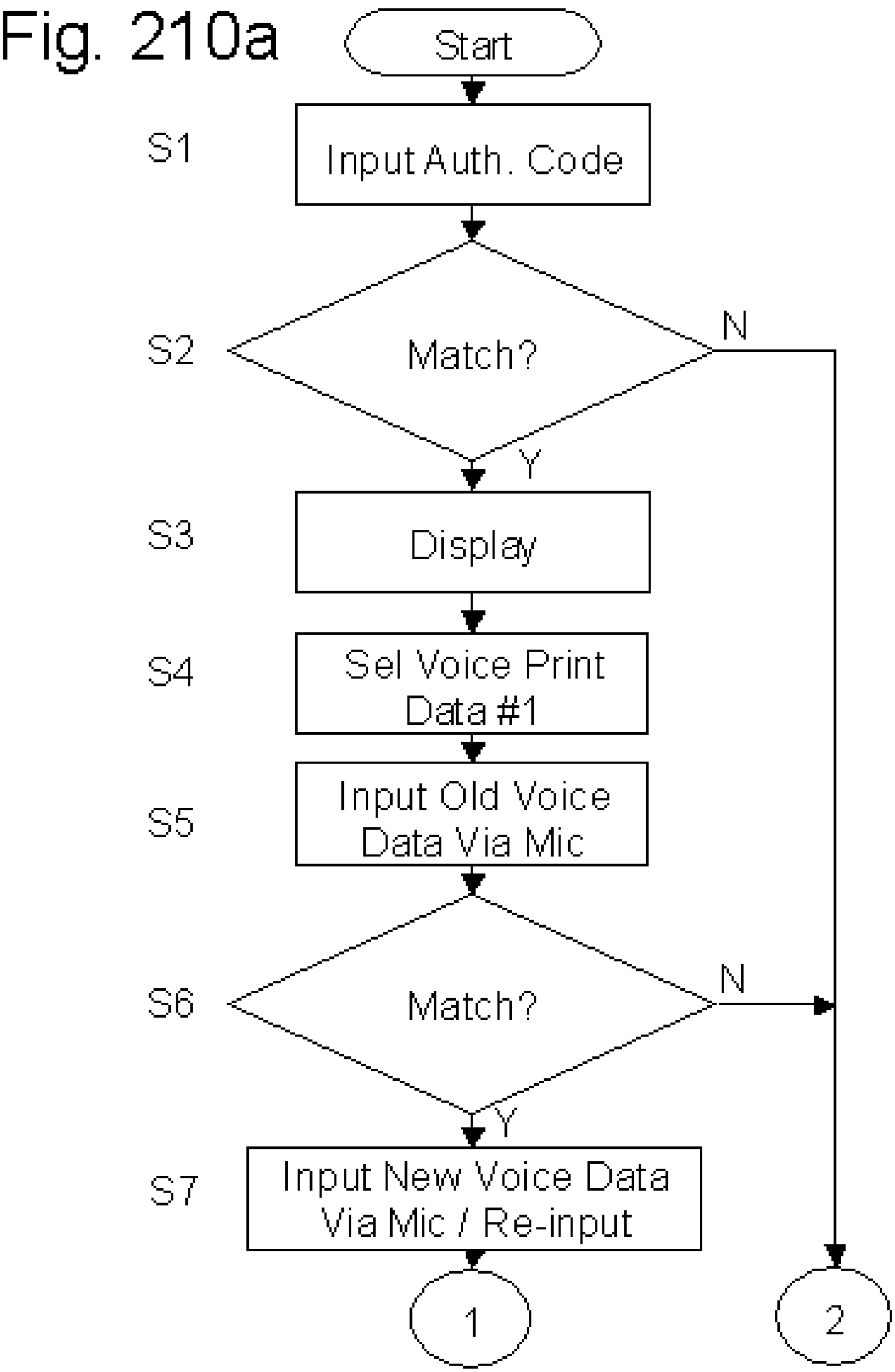

FIG. 210*a* is a flowchart illustrating an exemplary embodiment of the present invention.

Figure 210B:
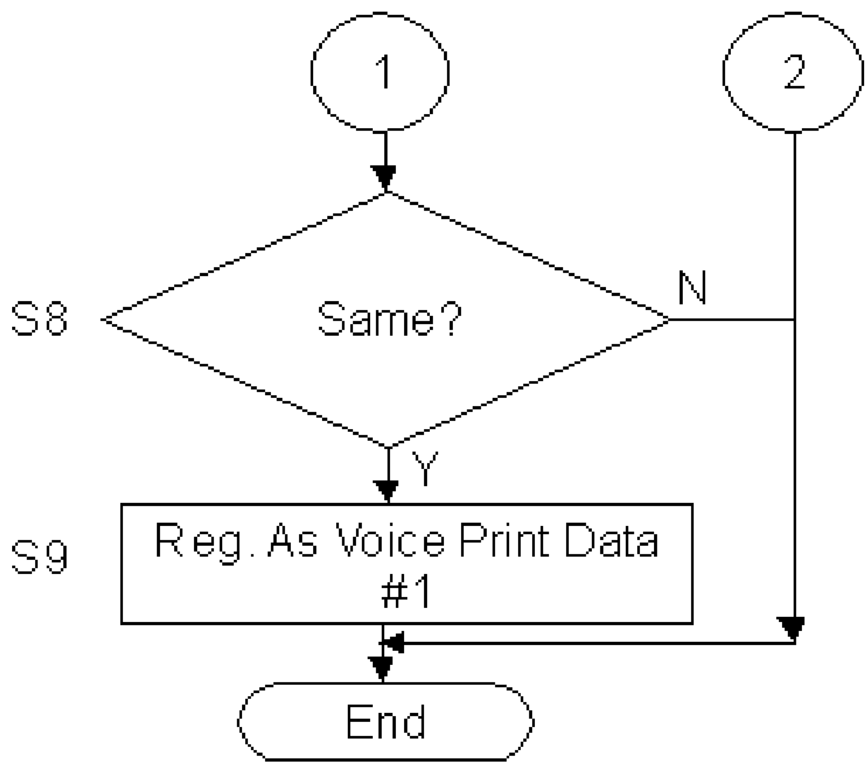

FIG. 210*b* is a flowchart illustrating an exemplary embodiment of the present invention.

Figure 211A:
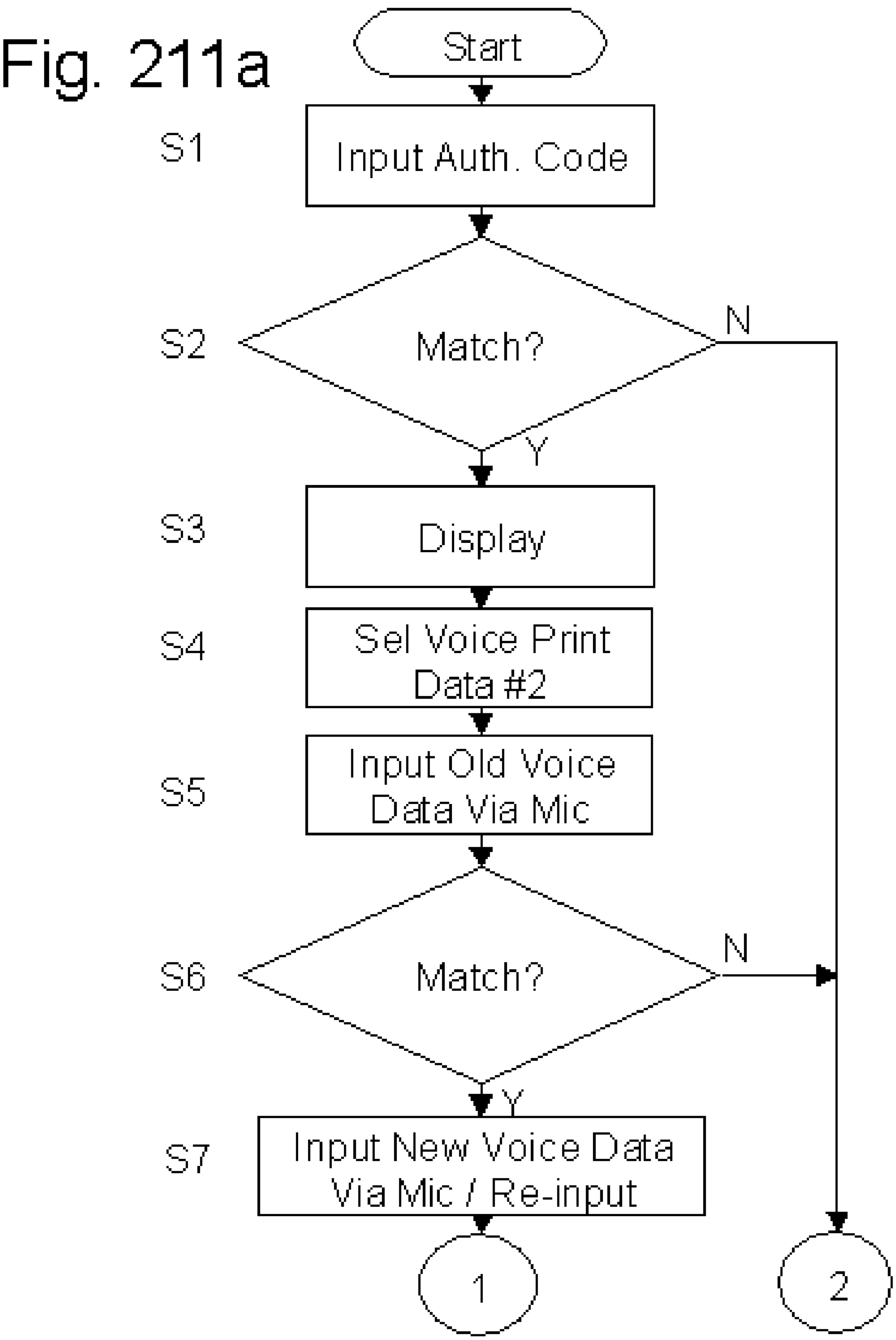

FIG. 211*a* is a flowchart illustrating an exemplary embodiment of the present invention.

Figure 211B:
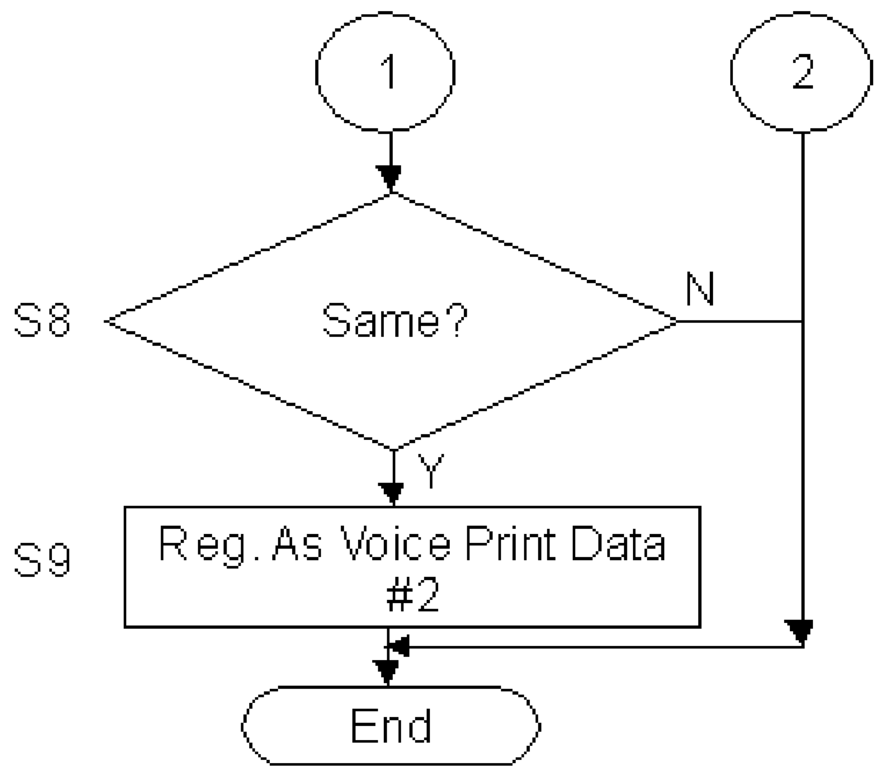

FIG. 211*b* is a flowchart illustrating an exemplary embodiment of the present invention.

Figure 212:
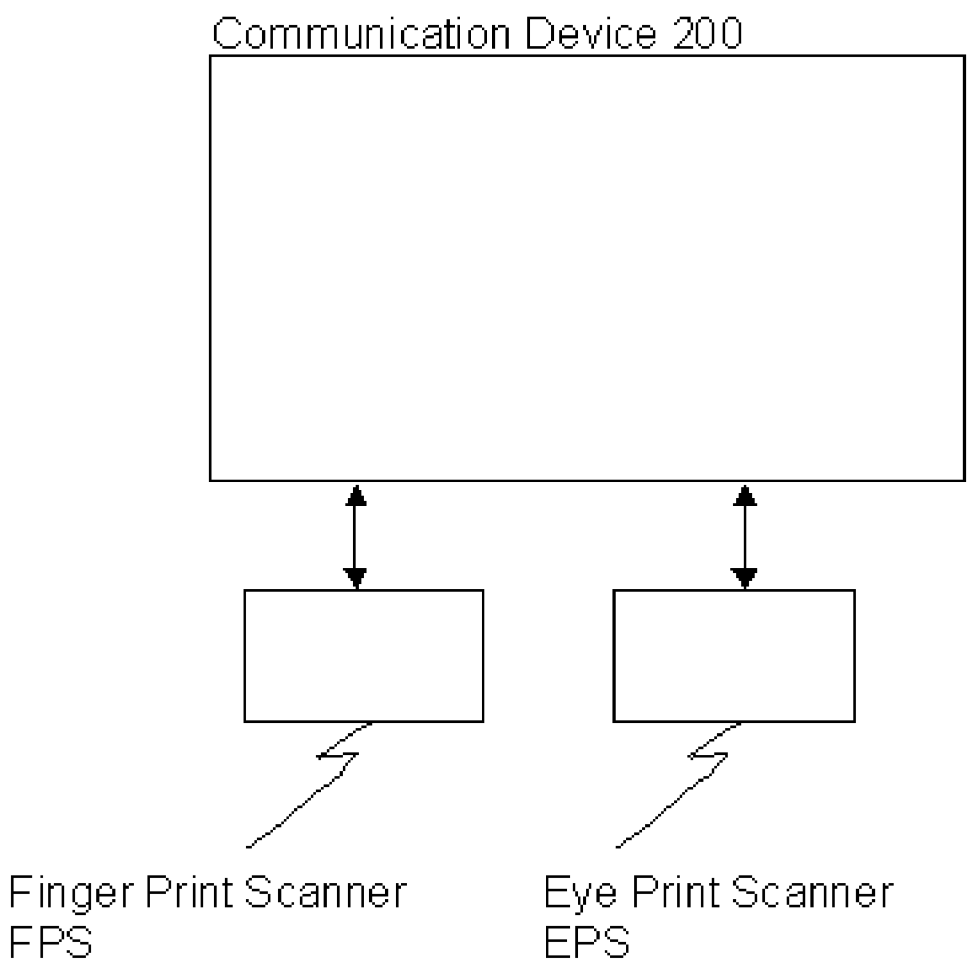

FIG. 212 is a block diagram illustrating an exemplary embodiment of the present invention.

Figure 213:
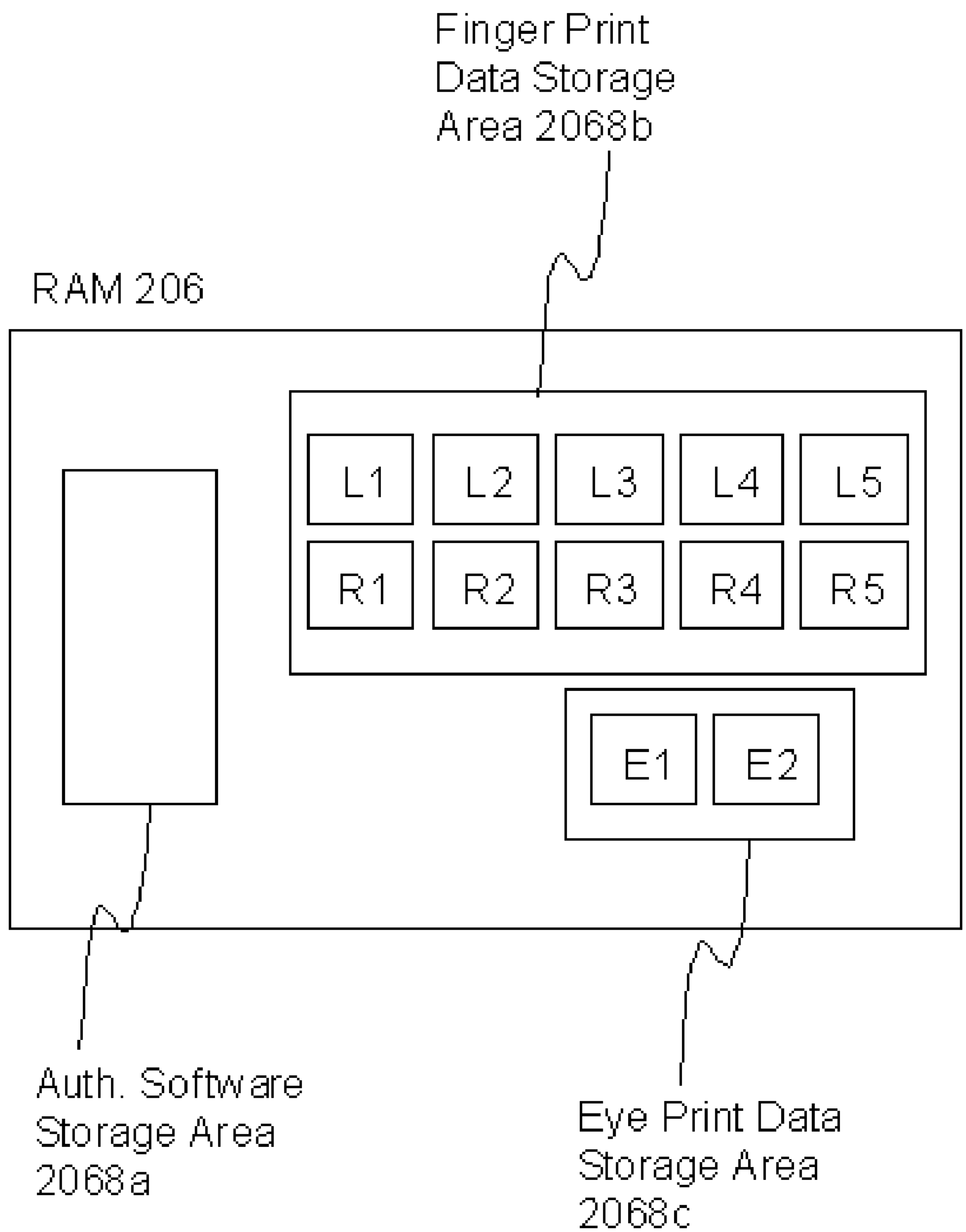

FIG. 213 is a block diagram illustrating an exemplary embodiment of the present invention.

Figure 214:
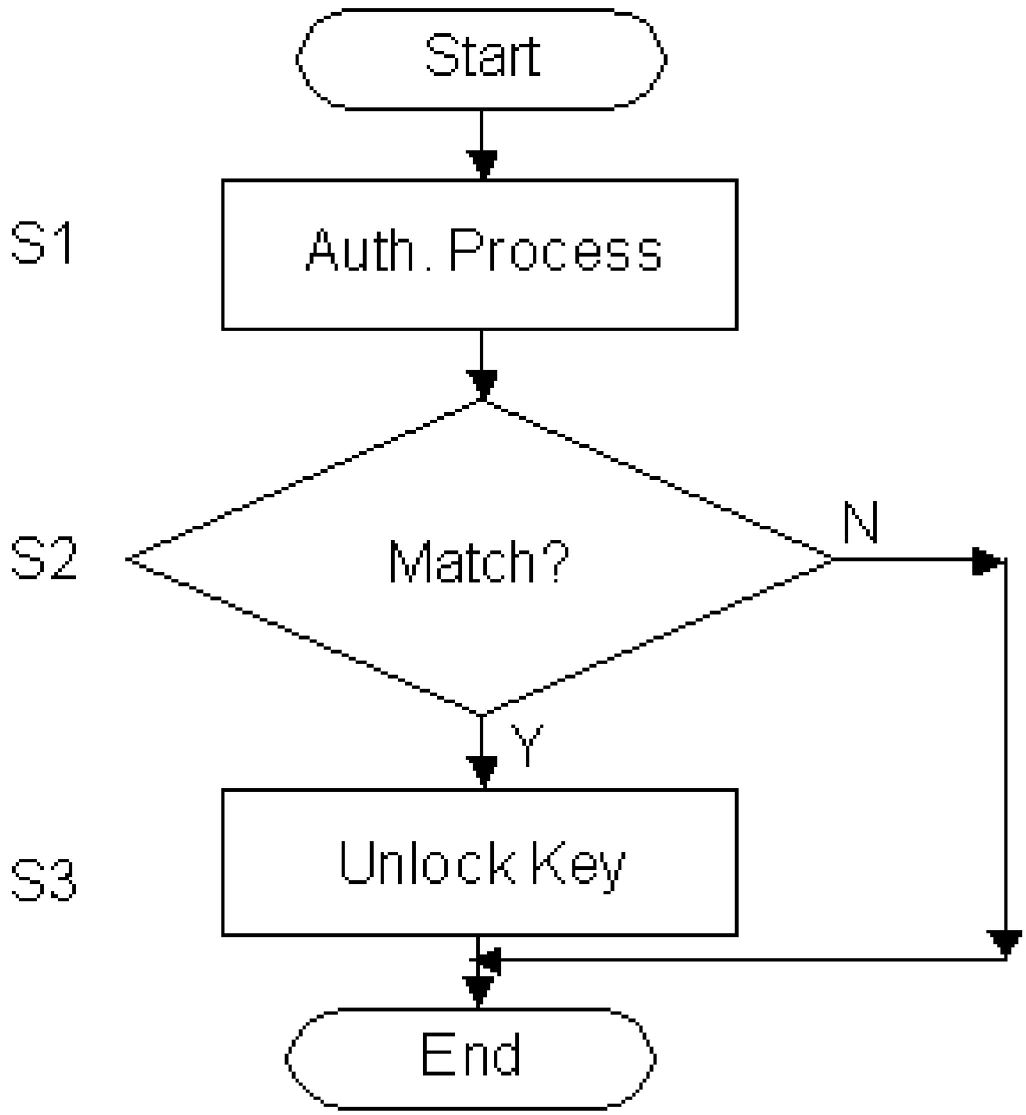

FIG. 214 is a flowchart illustrating an exemplary embodiment of the present invention.

Figure 215:
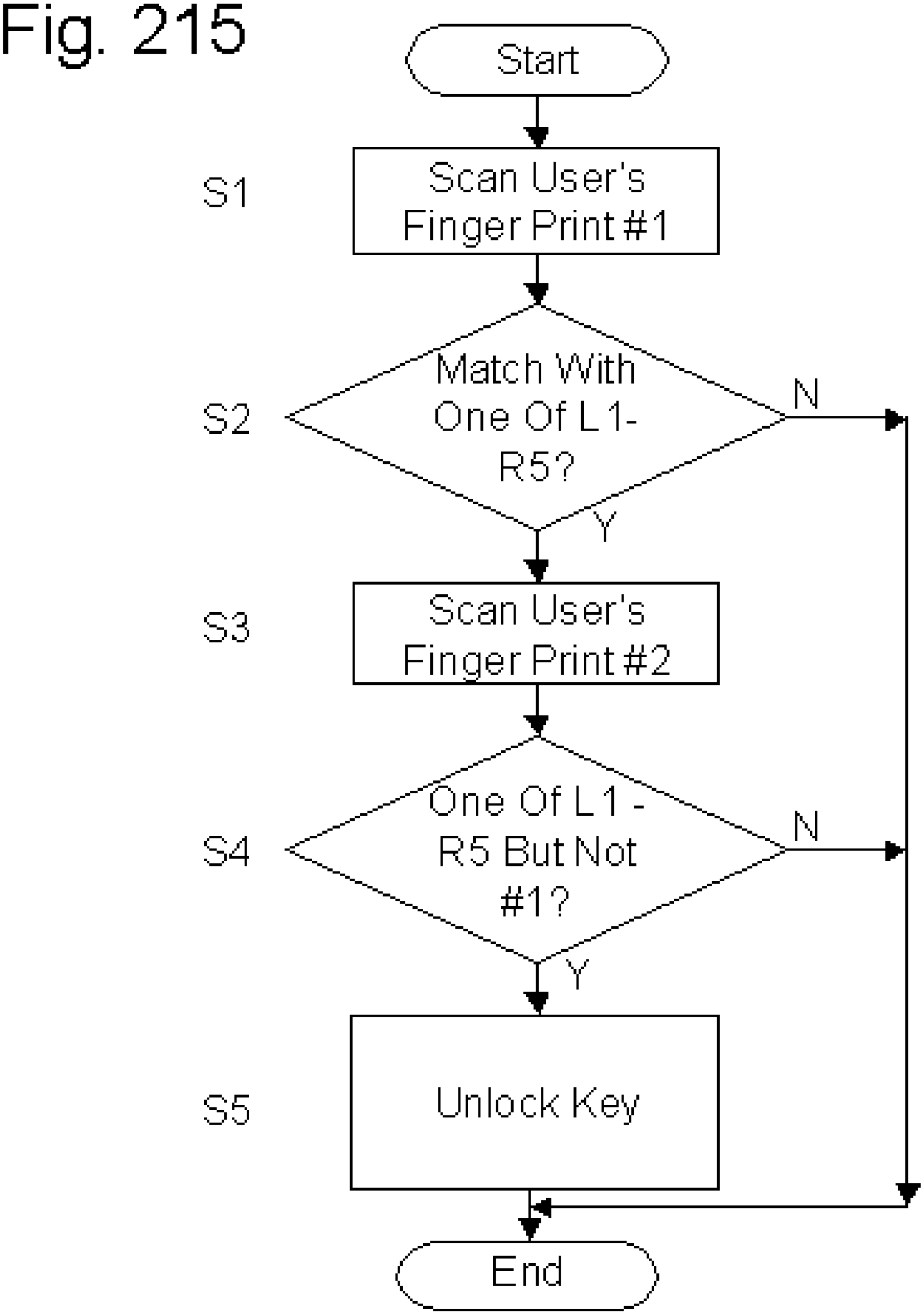

FIG. 215 is a flowchart illustrating an exemplary embodiment of the present invention.

Figure 216:
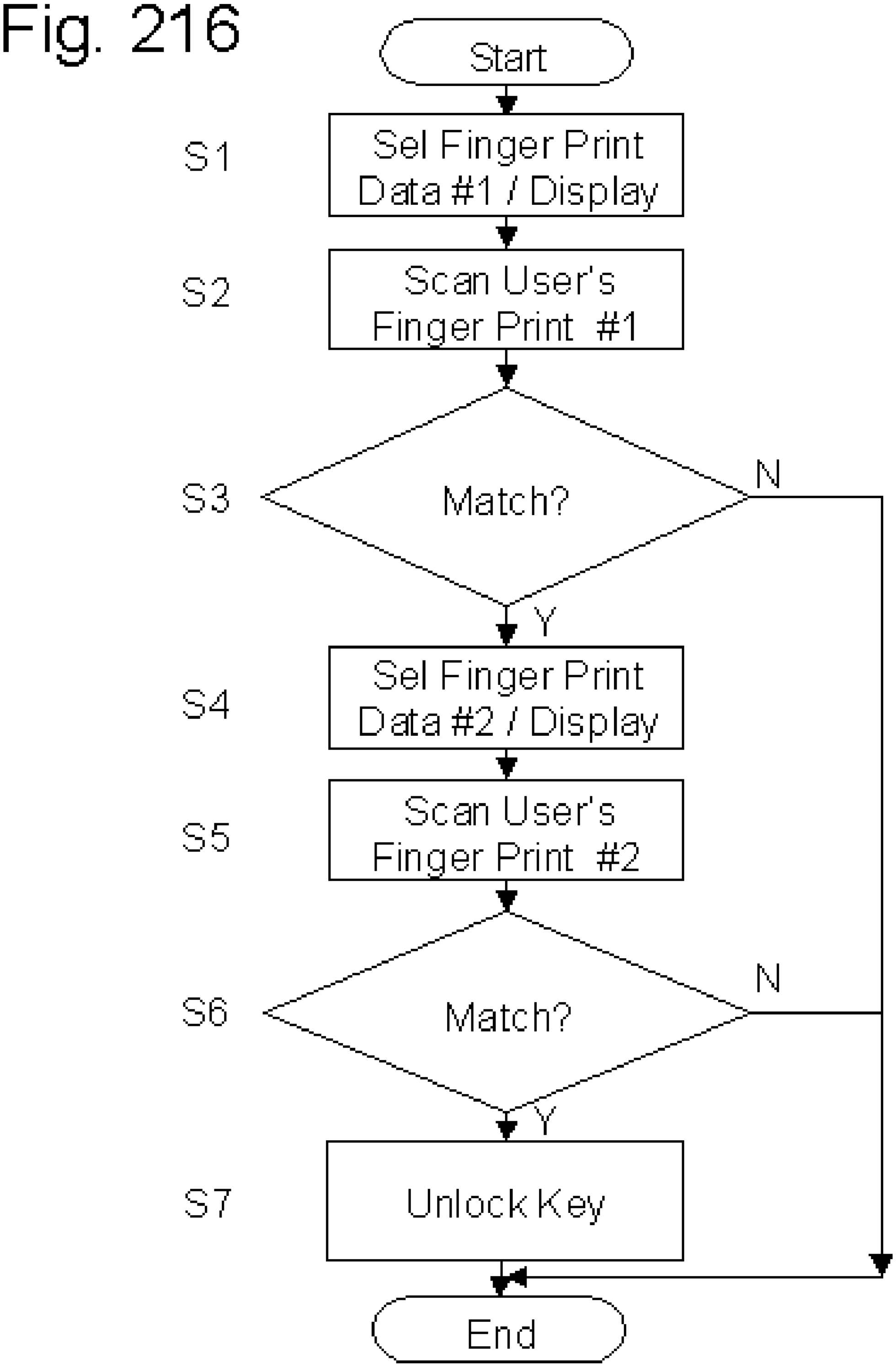

FIG. 216 is a flowchart illustrating an exemplary embodiment of the present invention.

Figure 217:
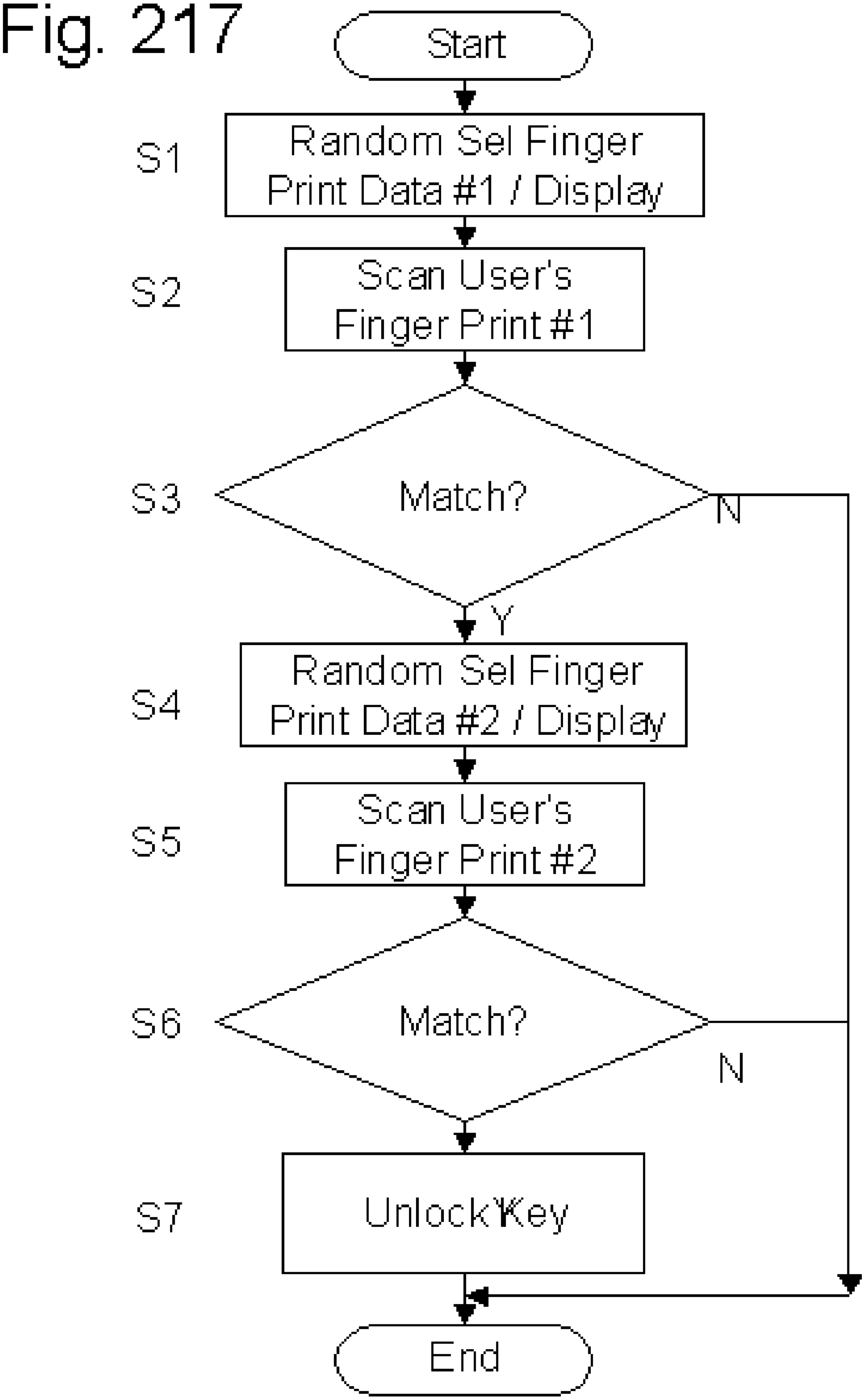

FIG. 217 is a flowchart illustrating an exemplary embodiment of the present invention.

Figure 218:
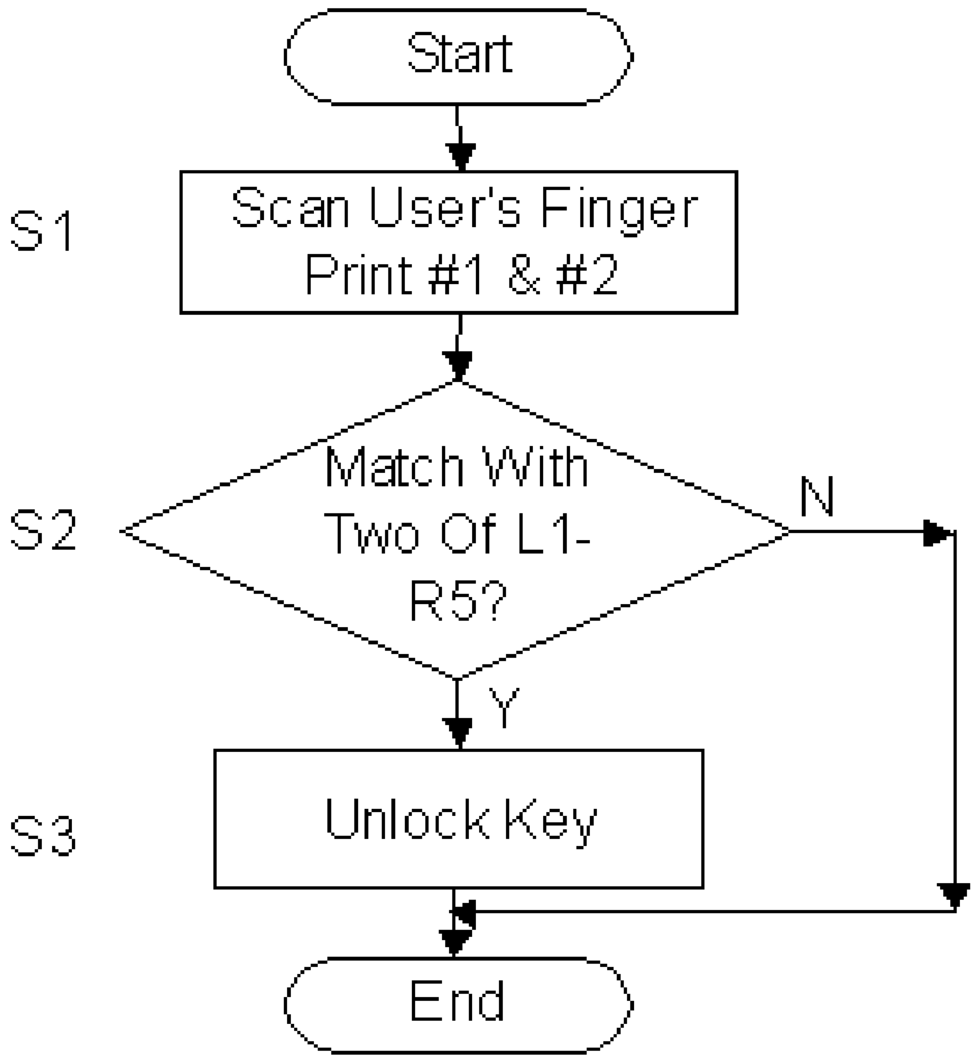

FIG. 218 is a flowchart illustrating an exemplary embodiment of the present invention.

Figure 219:
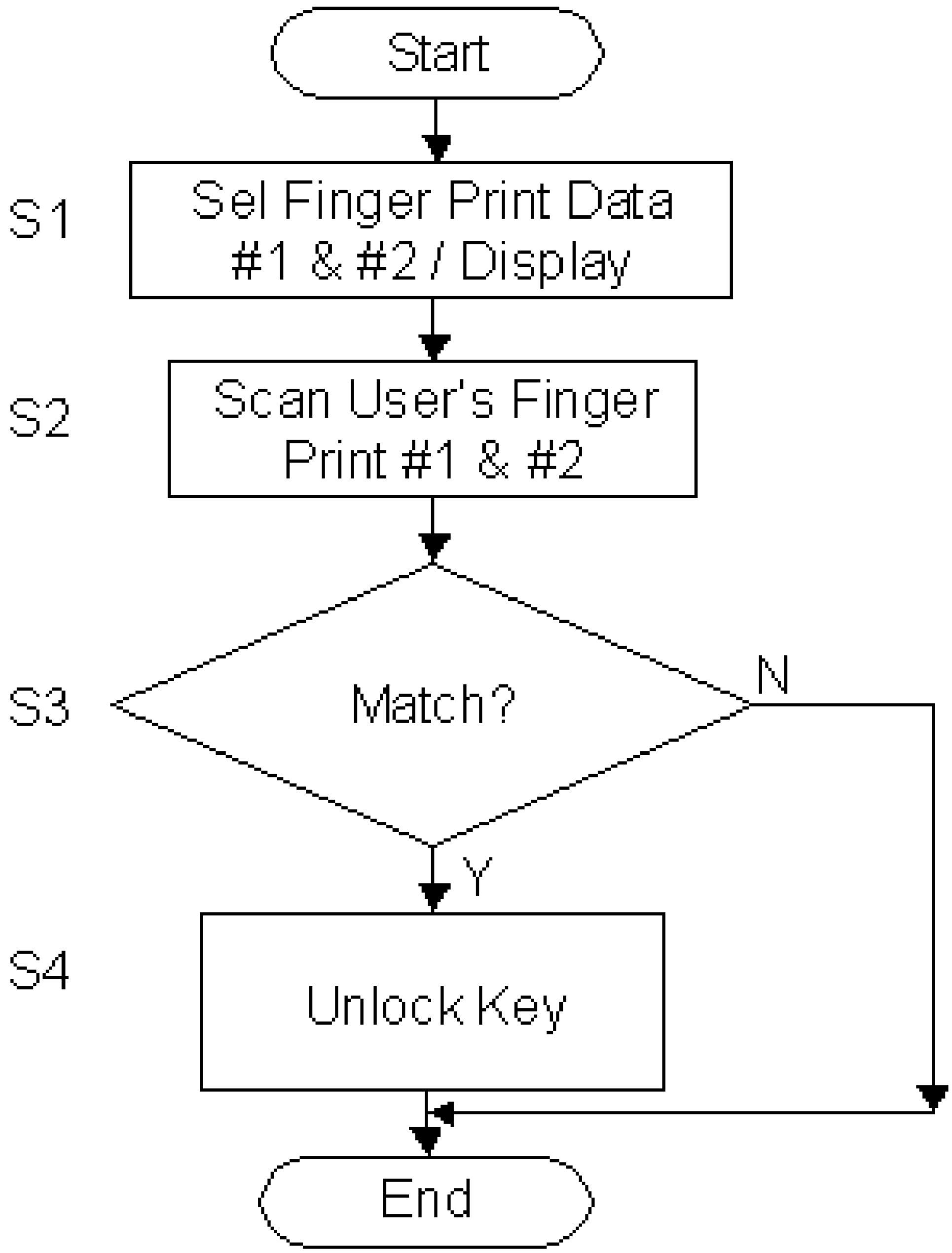

FIG. 219 is a flowchart illustrating an exemplary embodiment of the present invention.

Figure 220:
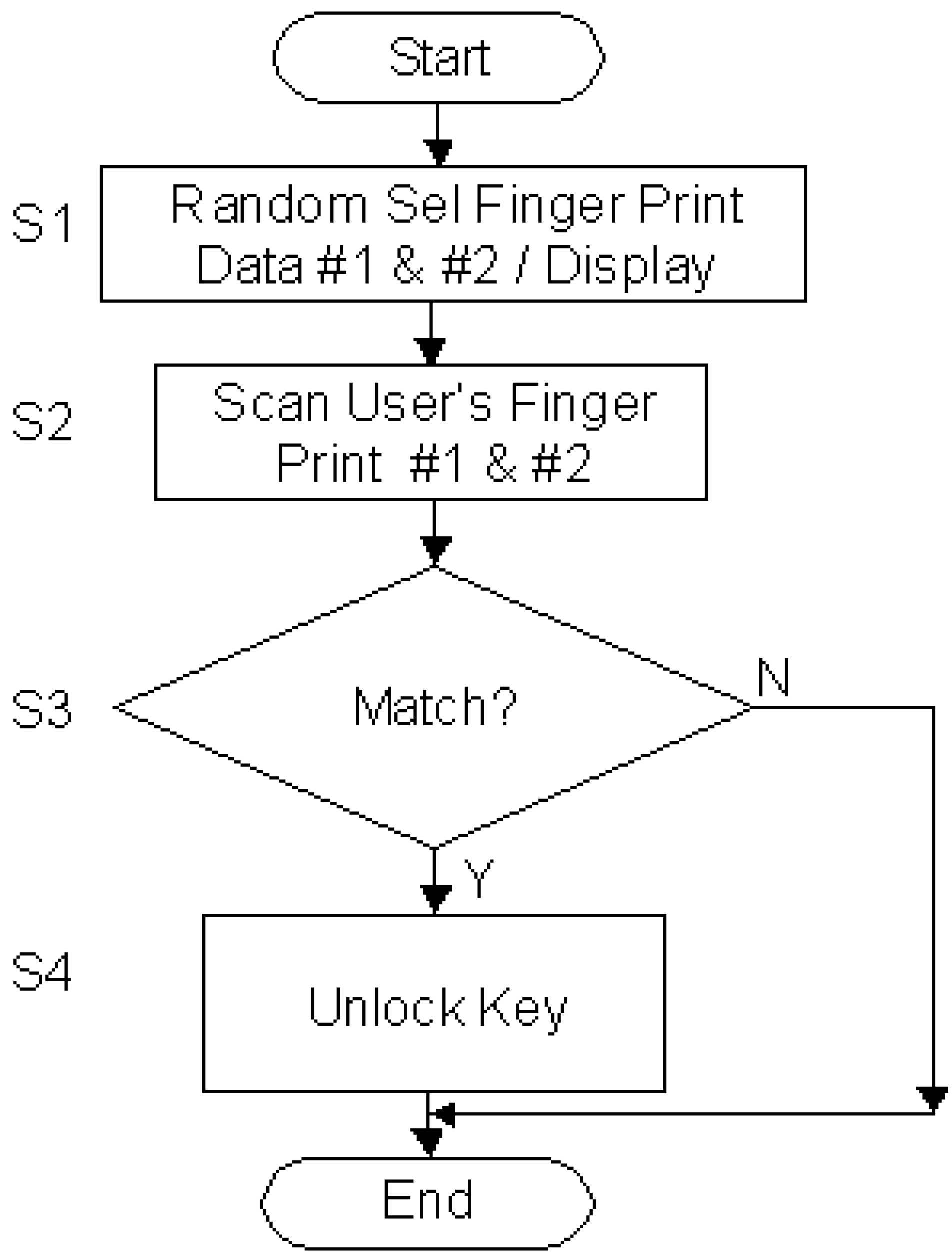

FIG. 220 is a flowchart illustrating an exemplary embodiment of the present invention.

Figure 221:
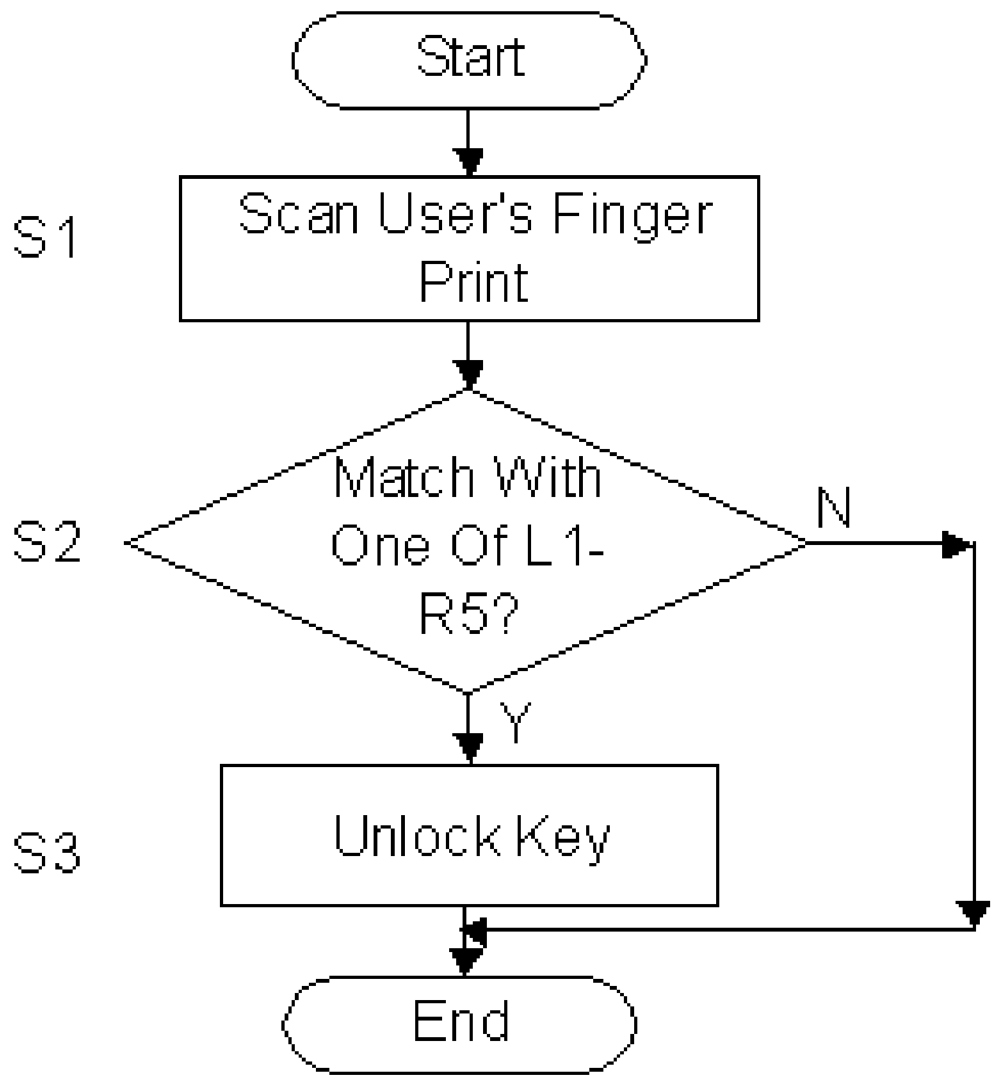

FIG. 221 is a flowchart illustrating an exemplary embodiment of the present invention.

Figure 222:
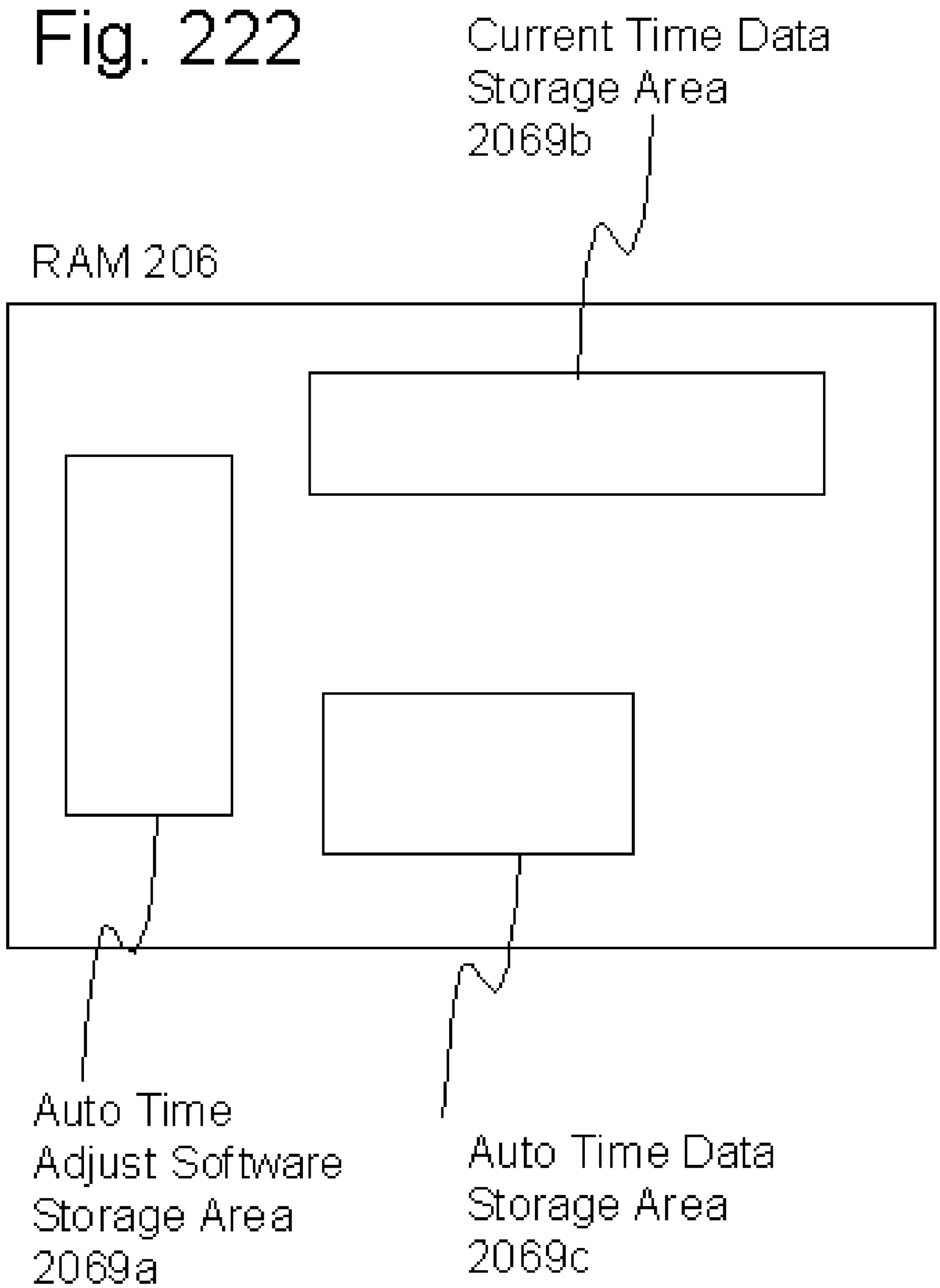

FIG. 222 is a block diagram illustrating an exemplary embodiment of the present invention.

Figure 223:
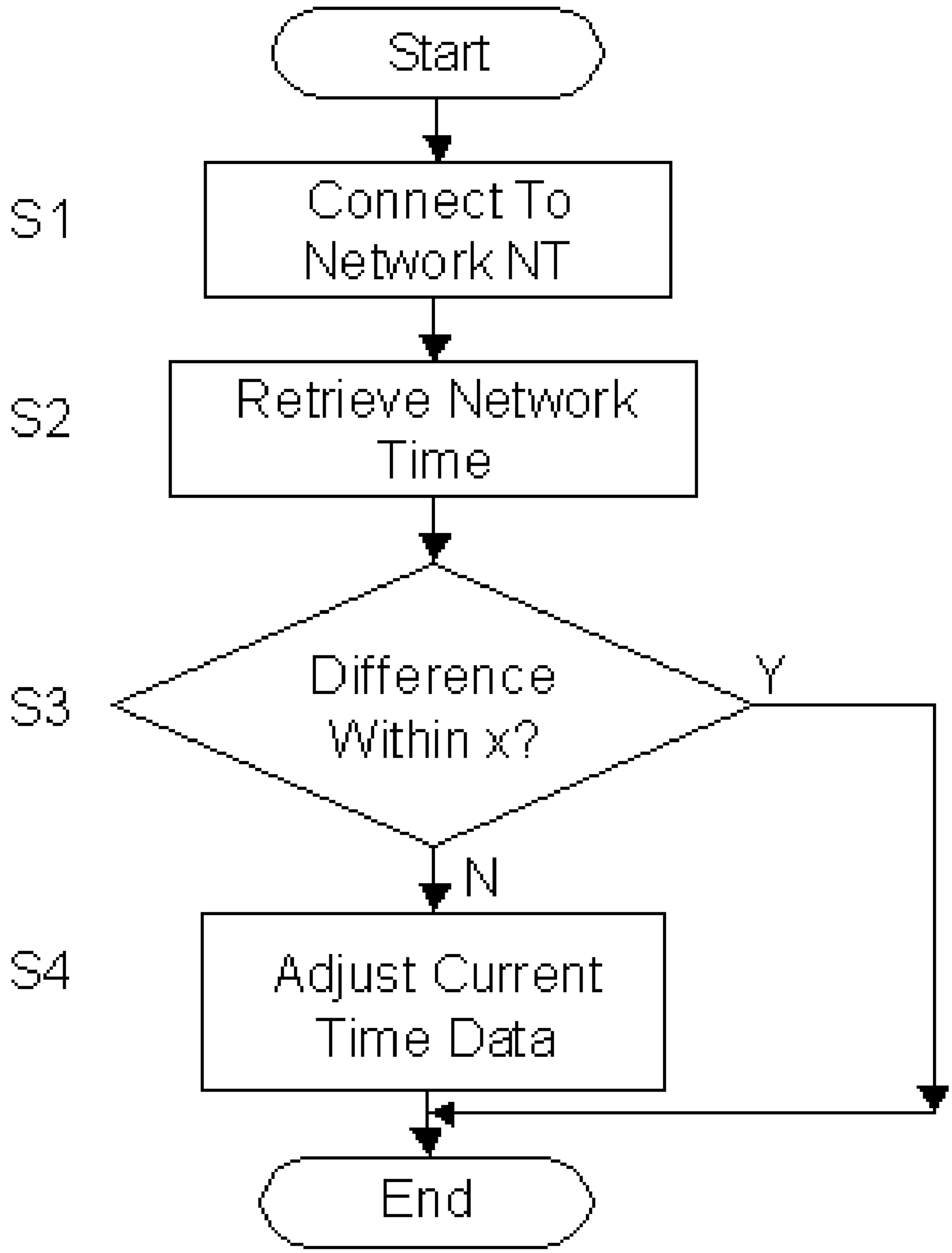

FIG. 223 is a flowchart illustrating an exemplary embodiment of the present invention.

Figure 224:
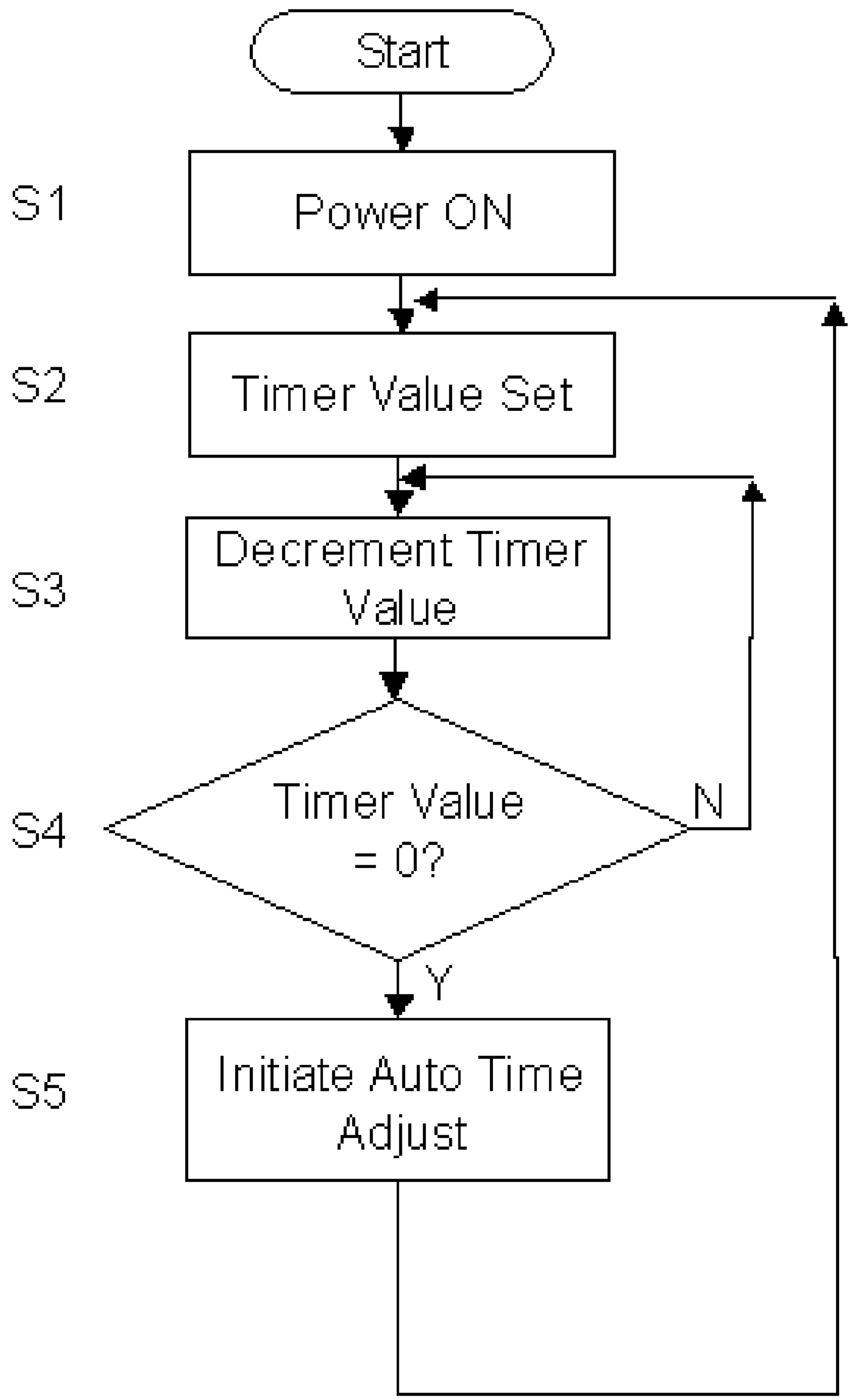

FIG. 224 is a flowchart illustrating an exemplary embodiment of the present invention.

Figure 225:
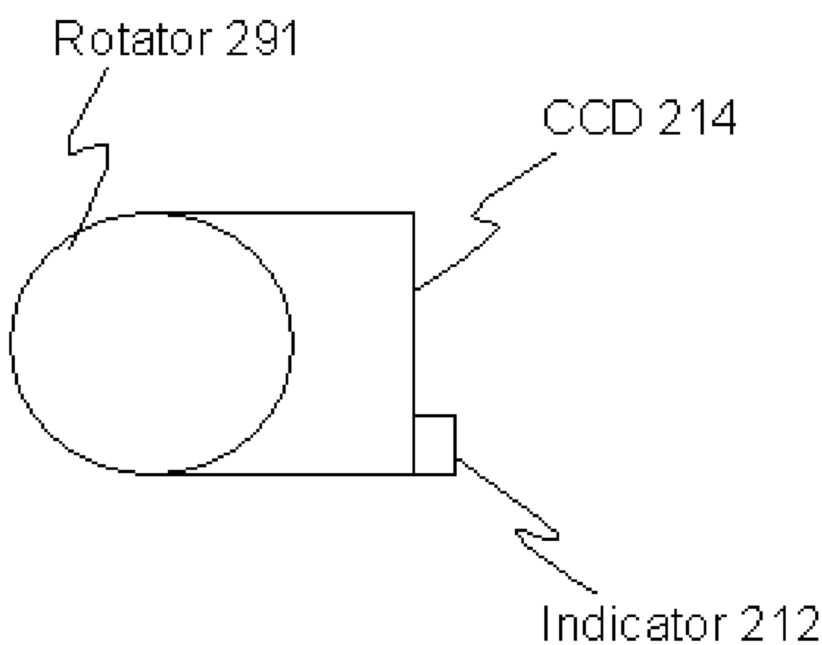

FIG. 225 is a simplified illustration illustrating an exemplary embodiment of the present invention.

Figure 226:
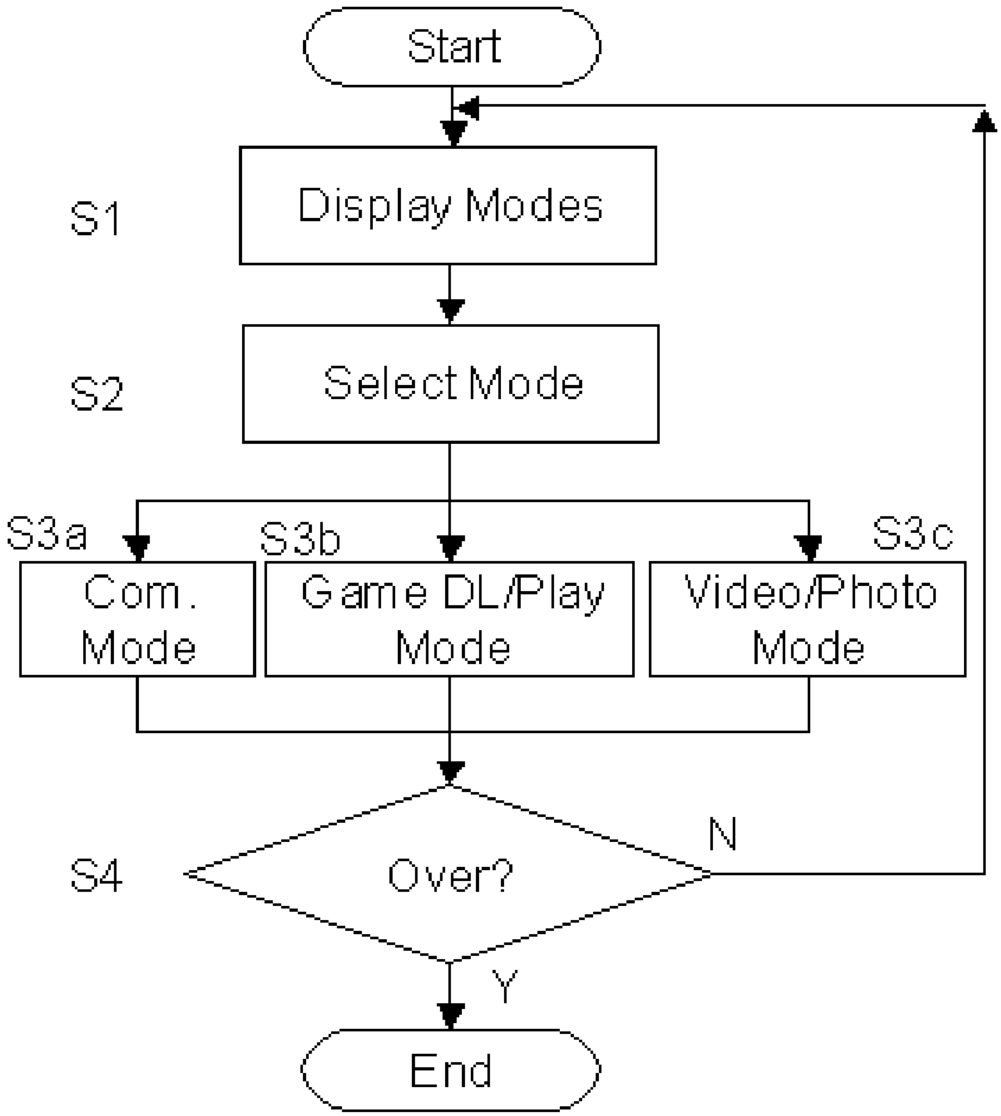

FIG. 226 is a flowchart illustrating an exemplary embodiment of the present invention.

Figure 227:
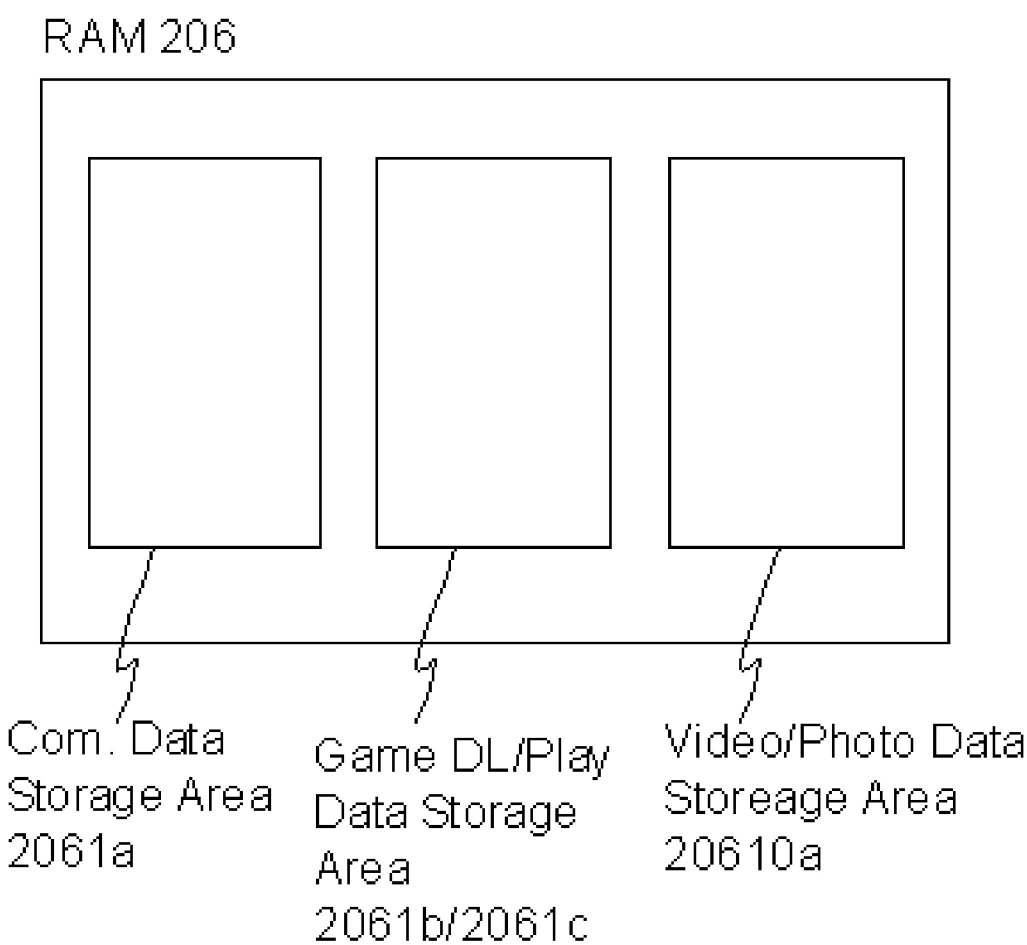

FIG. 227 is a block diagram illustrating an exemplary embodiment of the present invention.

Figure 228:
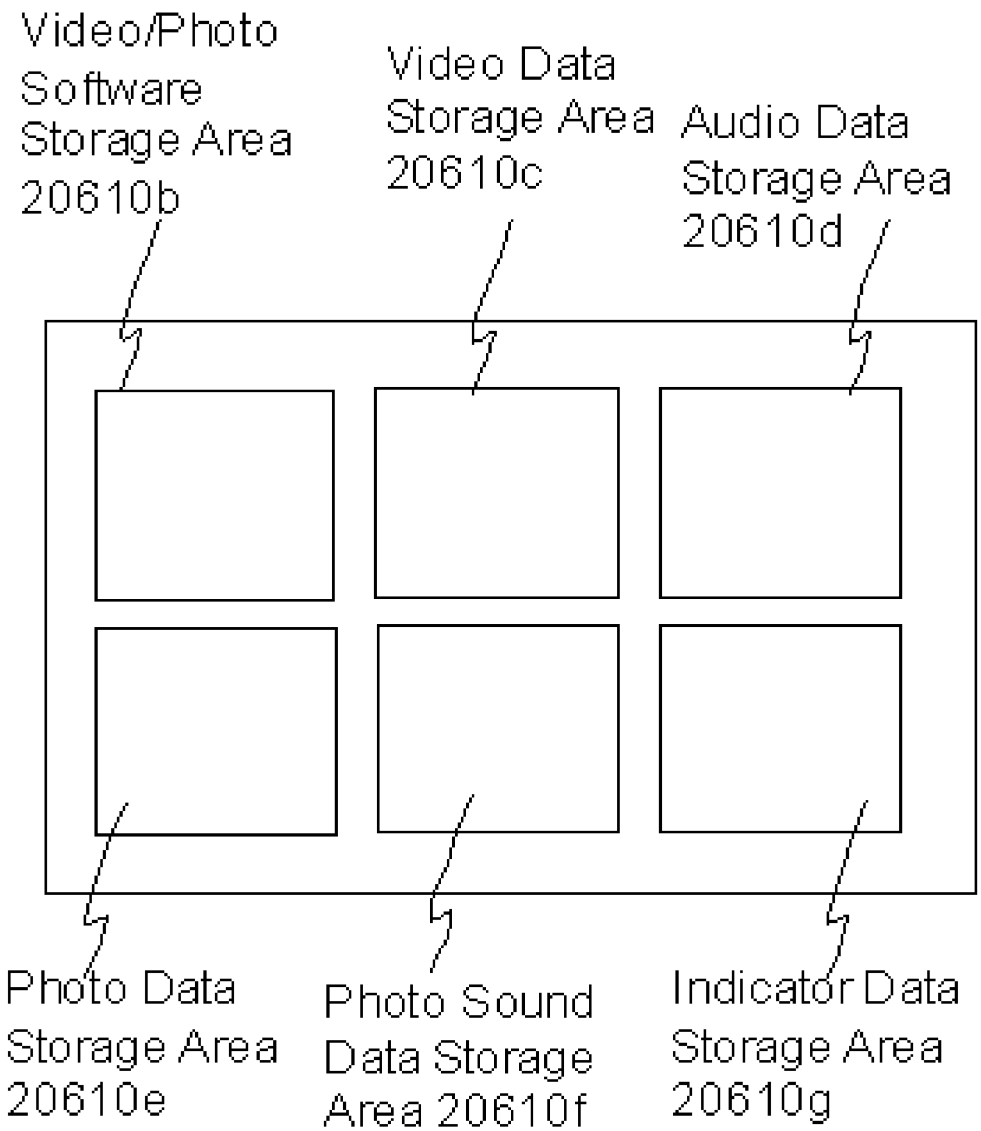

FIG. 228 is a block diagram illustrating an exemplary embodiment of the present invention.

Figure 228A:
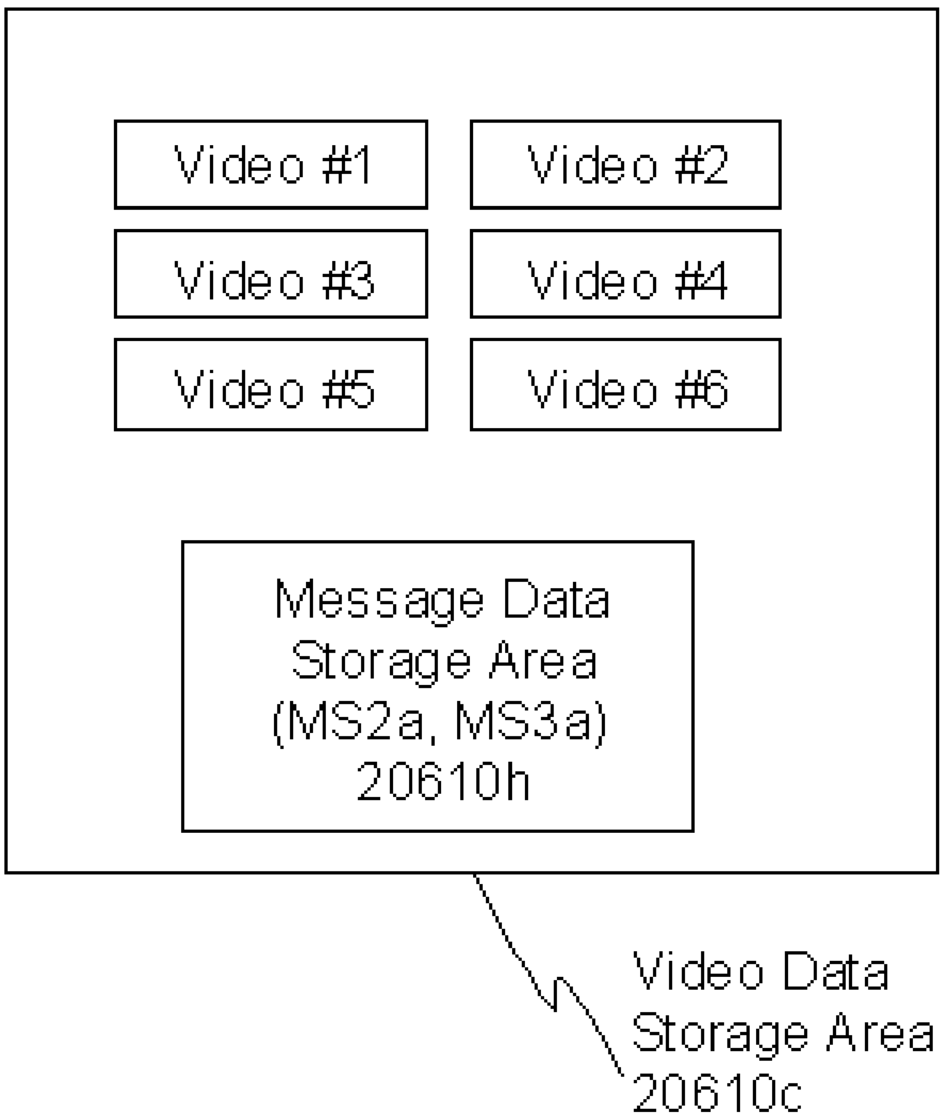

FIG. 228*a* is a block diagram illustrating an exemplary embodiment of the present invention.

Figure 228B:
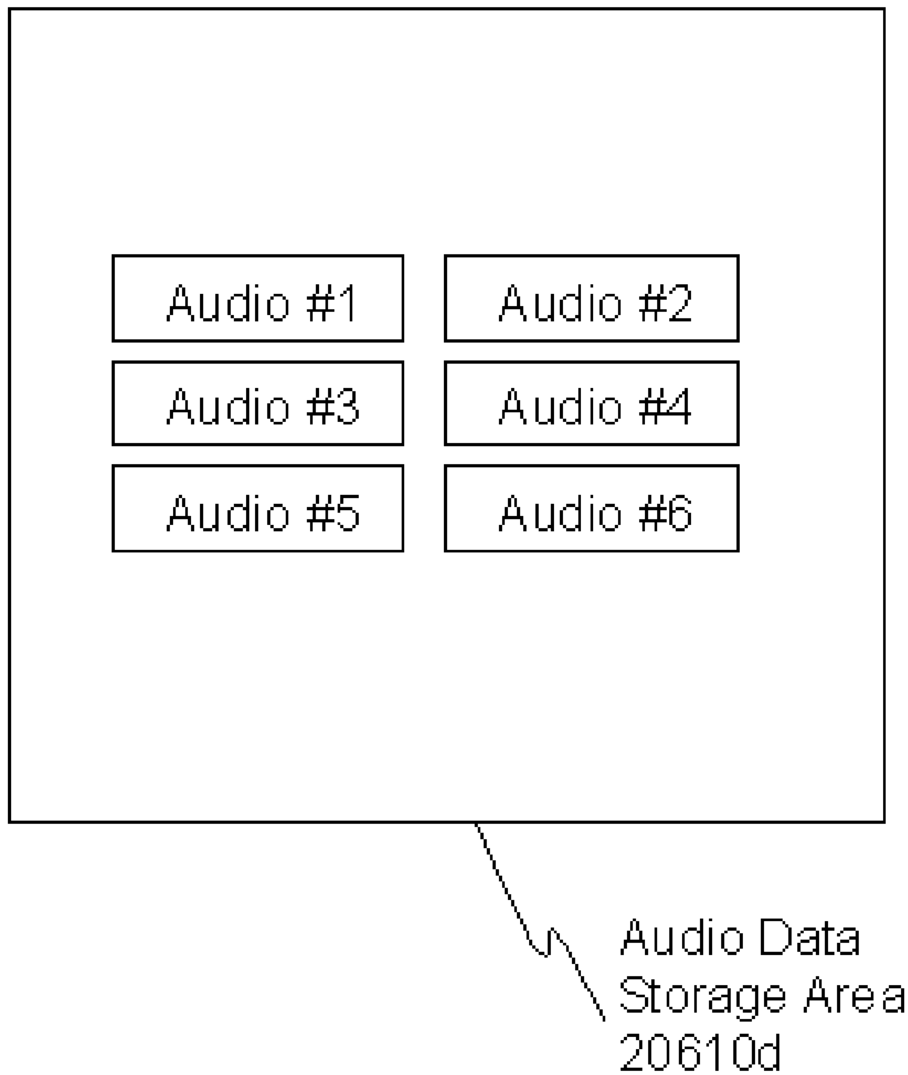

FIG. 228*b* is a block diagram illustrating an exemplary embodiment of the present invention.

Figure 228C:
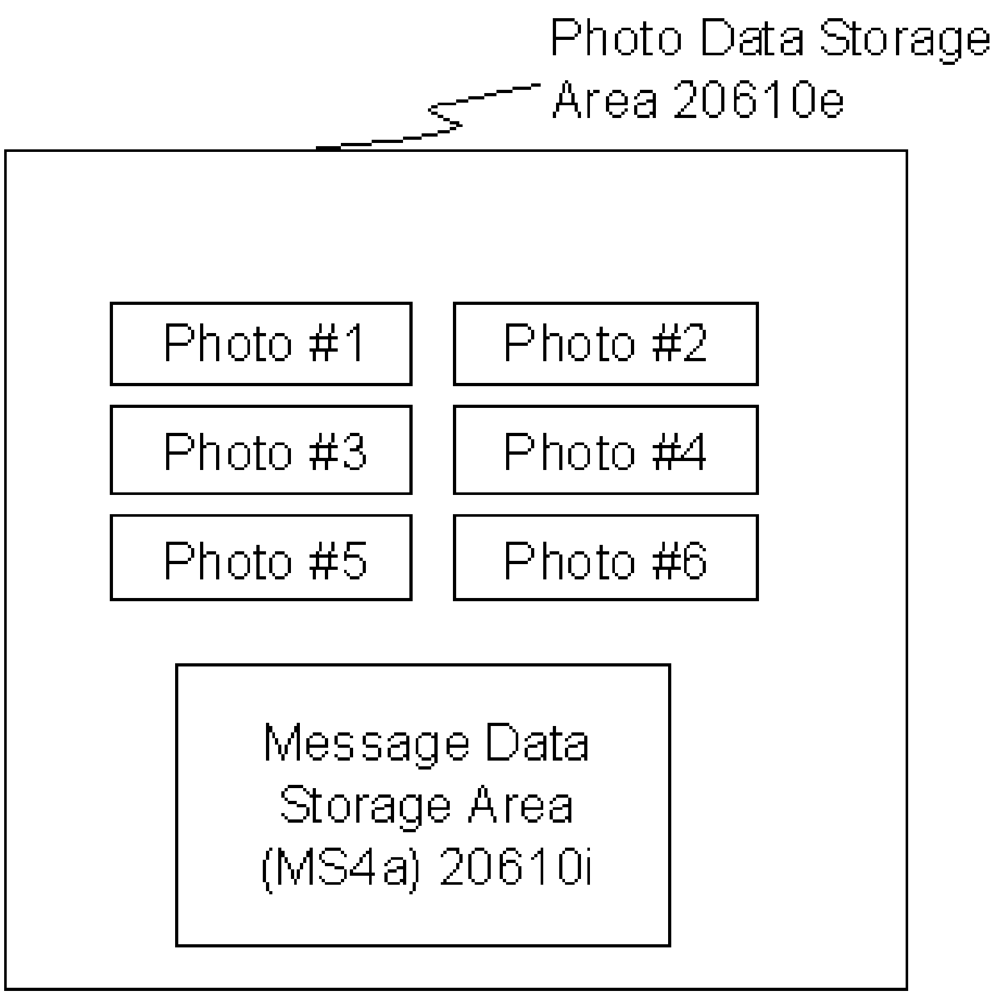

FIG. 228*c* is a block diagram illustrating an exemplary embodiment of the present invention.

FIG. 229 is a block diagram illustrating an exemplary embodiment of the present invention.

FIG. 230 is a block diagram illustrating an exemplary embodiment of the present invention.

Figure 231:
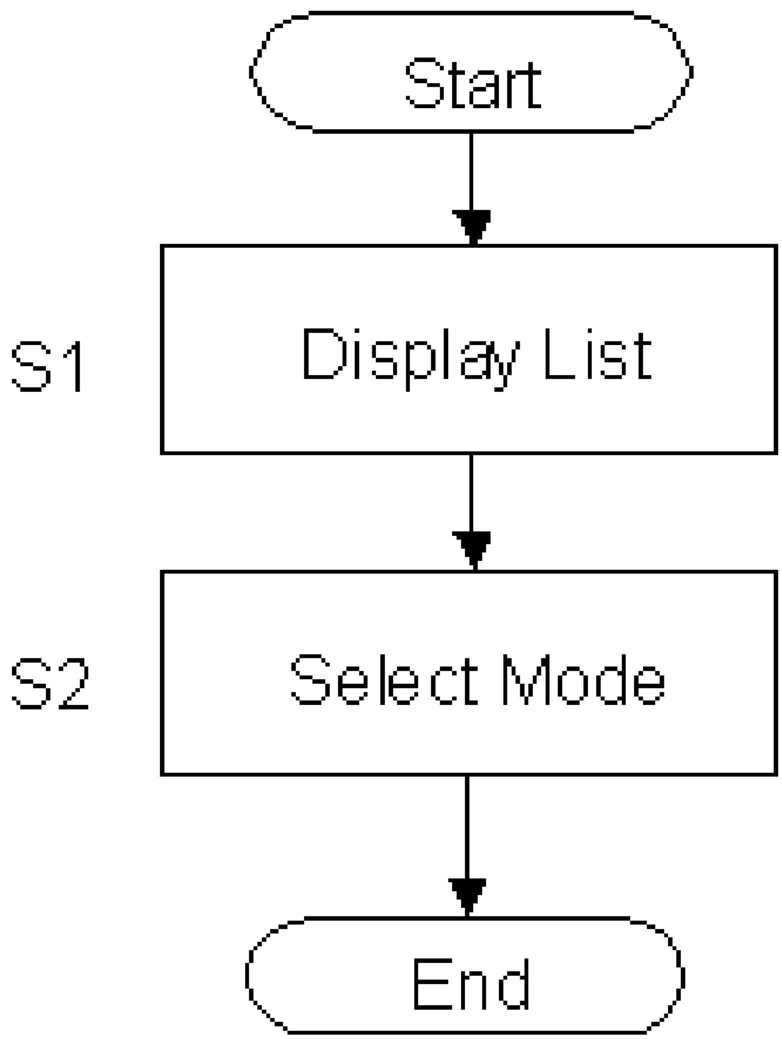

FIG. 231 is a flowchart illustrating an exemplary embodiment of the present invention.

Figure 232:
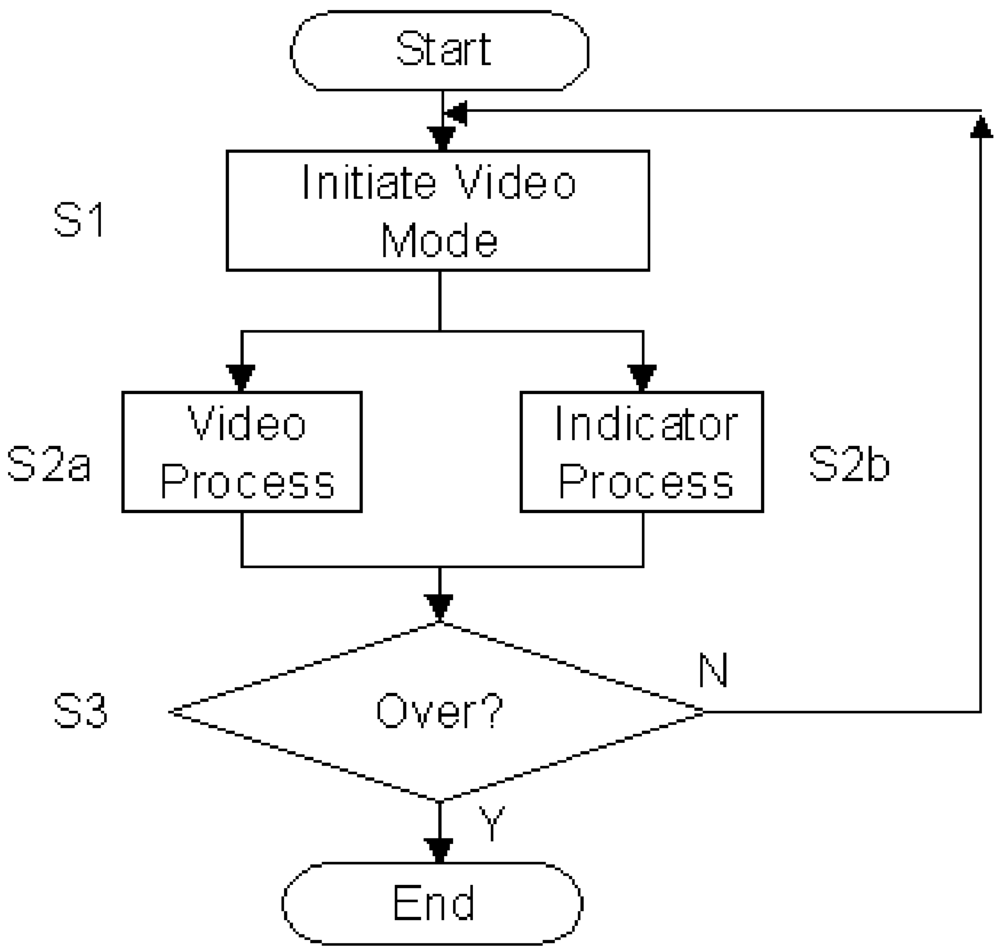

FIG. 232 is a flowchart illustrating an exemplary embodiment of the present invention.

Figure 232A:
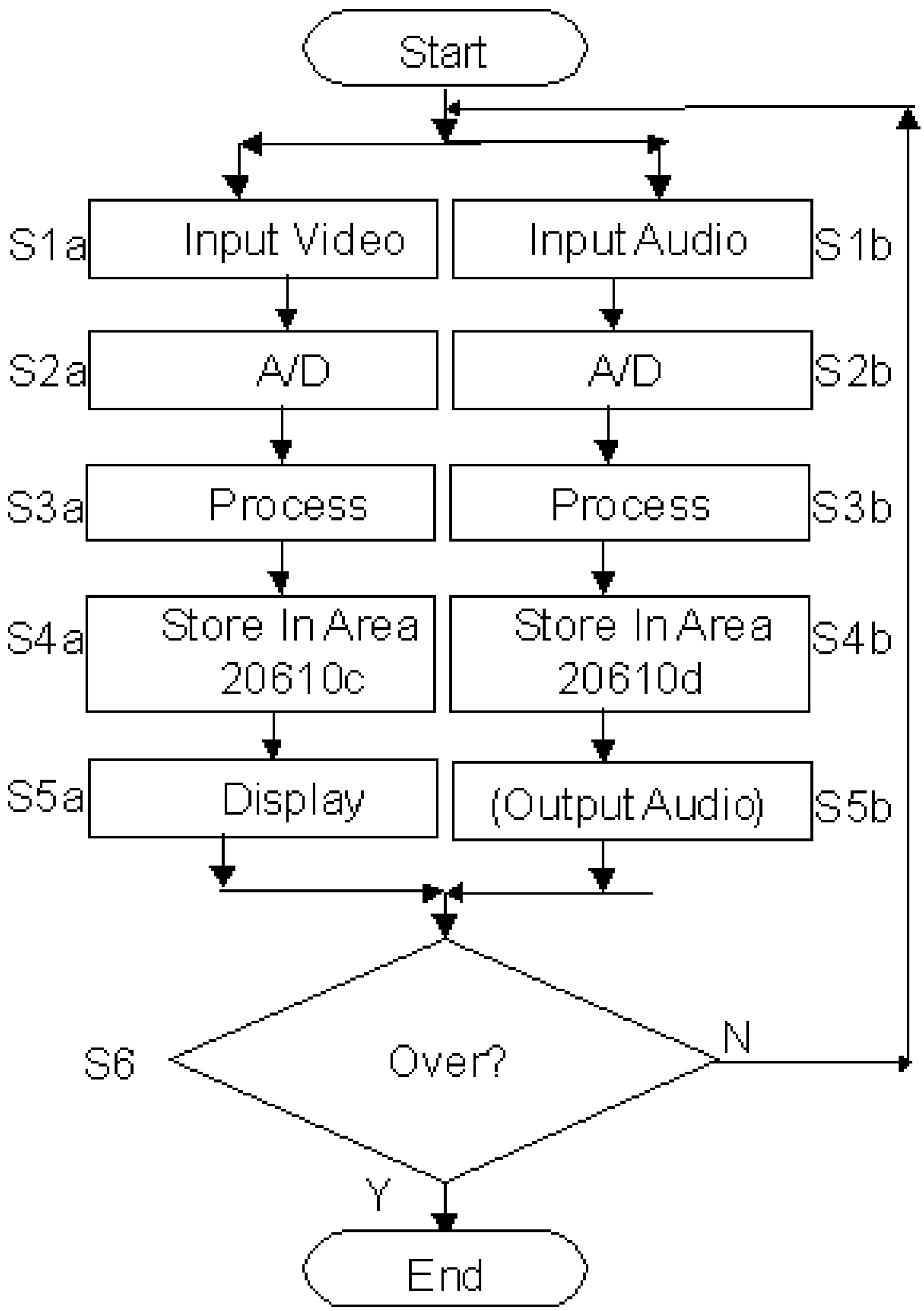

FIG. 232*a* is a flowchart illustrating an exemplary embodiment of the present invention.

Figure 233:
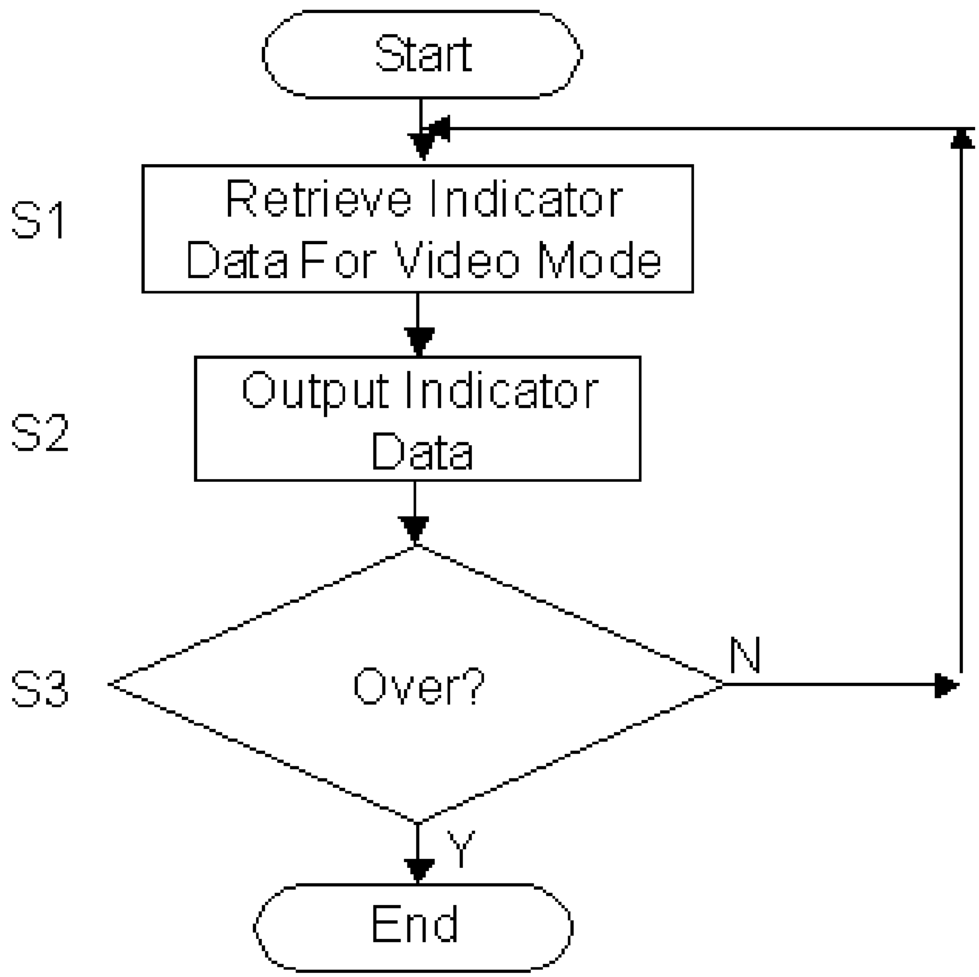

FIG. 233 is a flowchart illustrating an exemplary embodiment of the present invention.

Figure 233A:
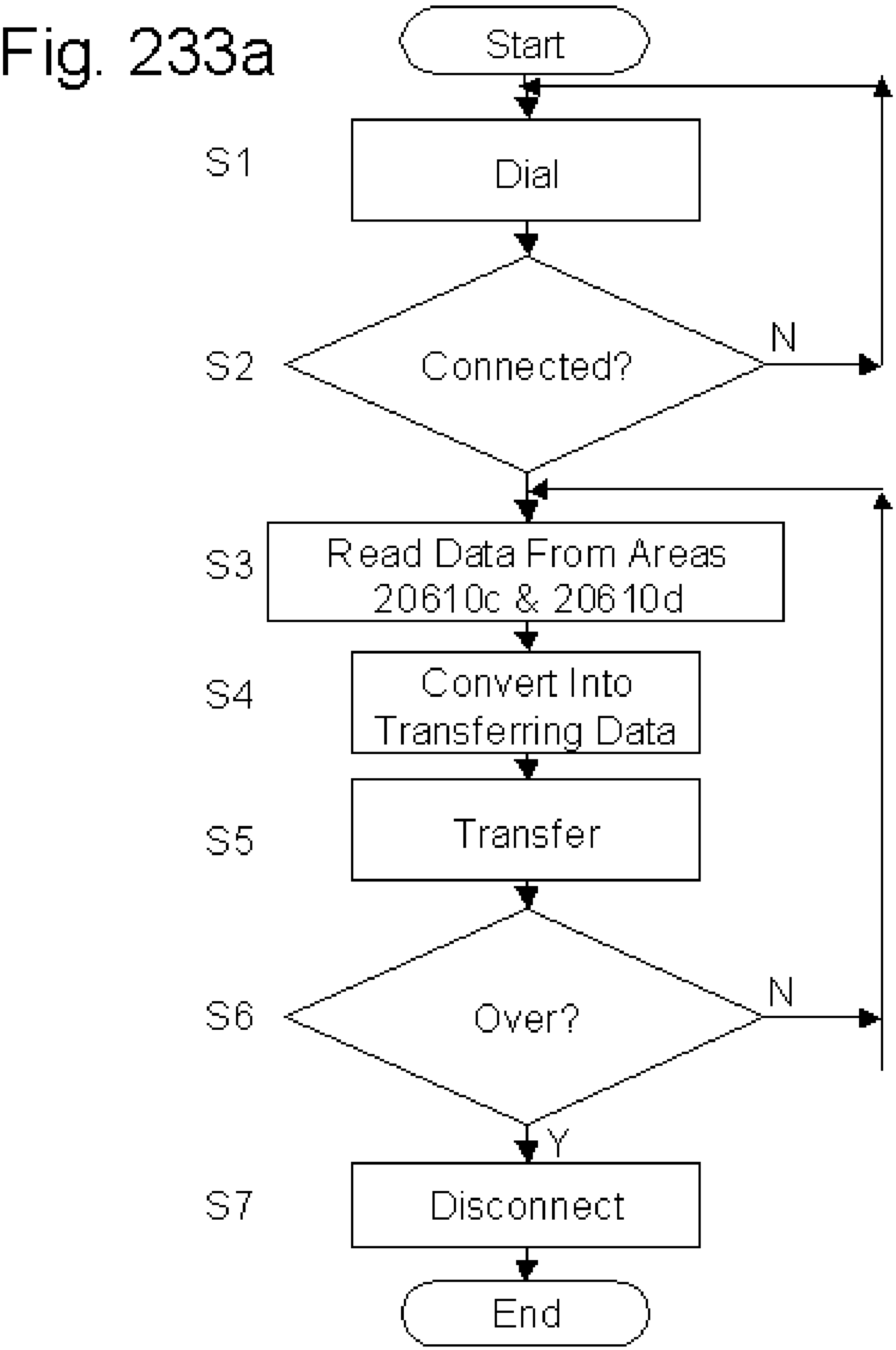

FIG. 233*a* is a flowchart illustrating an exemplary embodiment of the present invention.

Figure 233B:
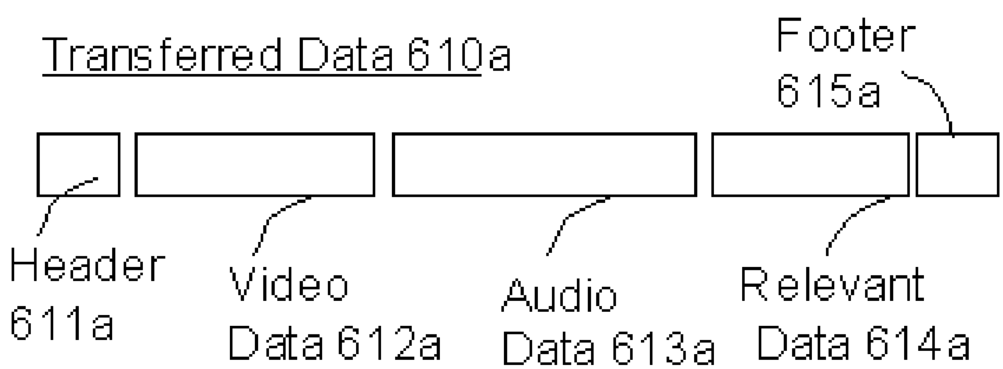

FIG. 233*b* is a simplified illustration of data utilized in the present invention.

Figure 233C:
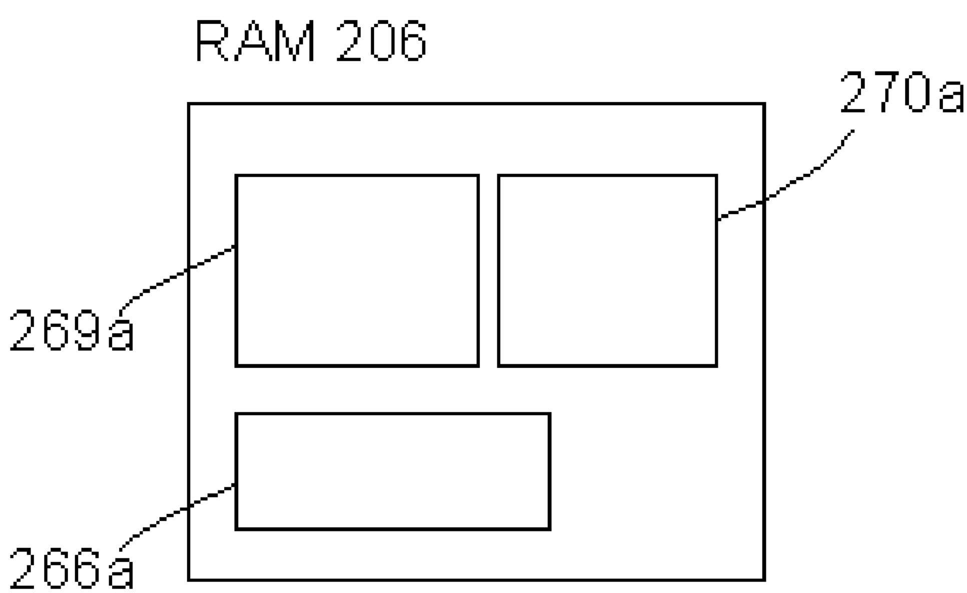

FIG. 233*c* is a block diagram illustrating an exemplary embodiment of the present invention.

Figure 233D:
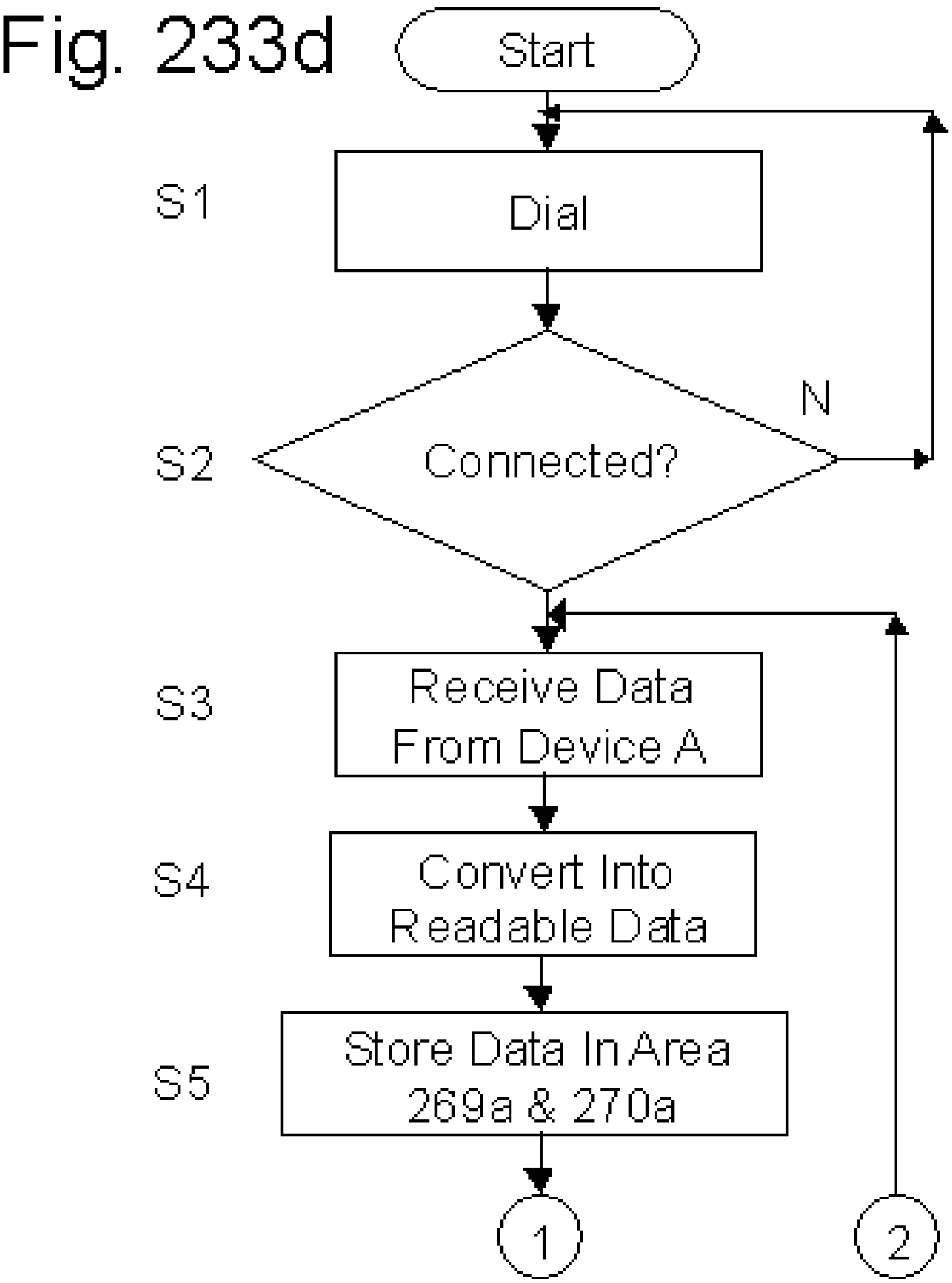

FIG. 233*d* is a flowchart illustrating an exemplary embodiment of the present invention.

Figure 233E:
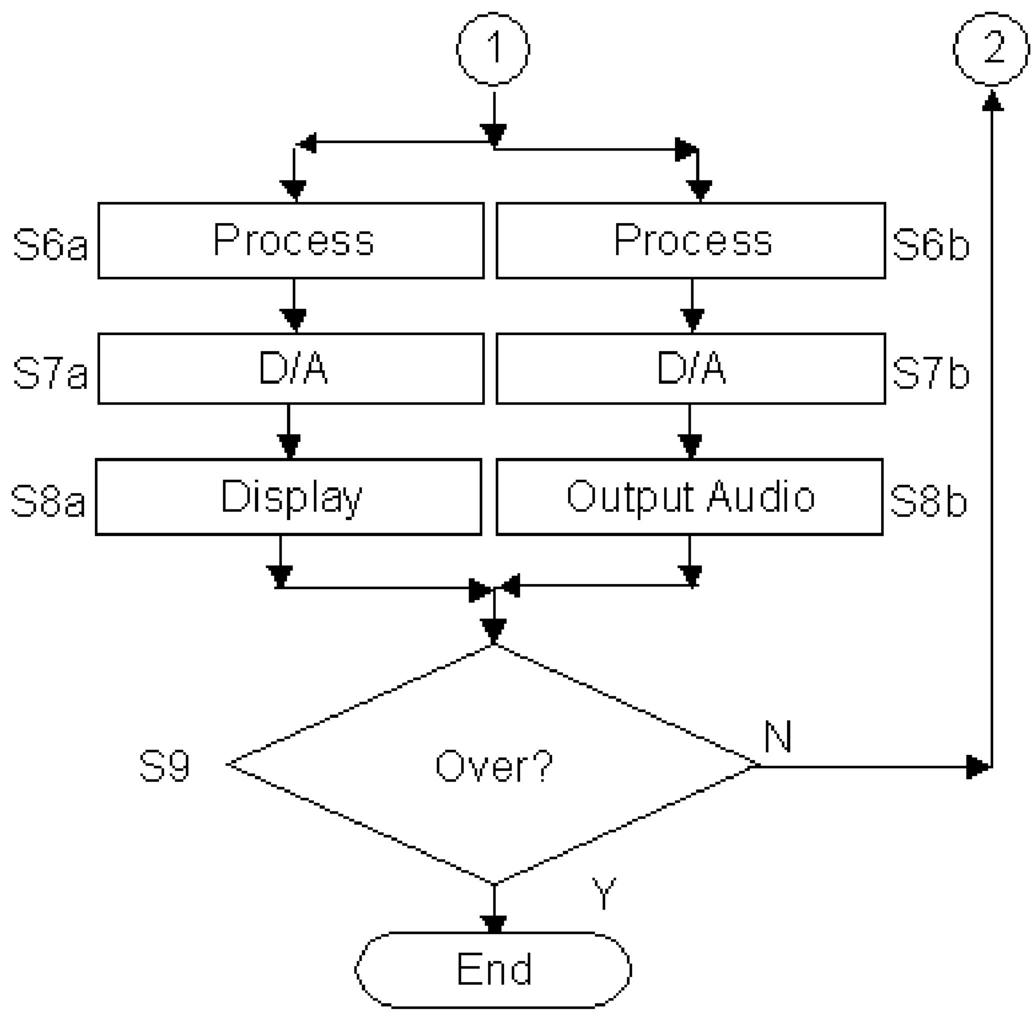

FIG. 233*e* is a flowchart illustrating an exemplary embodiment of the present invention.

Figure 234:
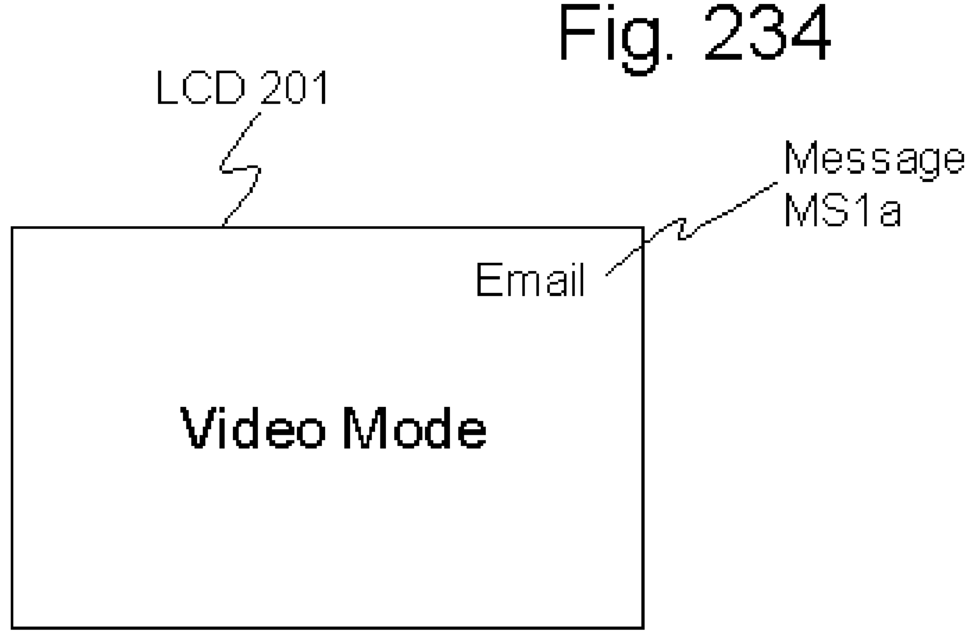

FIG. 234 is a simplified illustration illustrating an exemplary embodiment of the present invention.

Figure 234A:
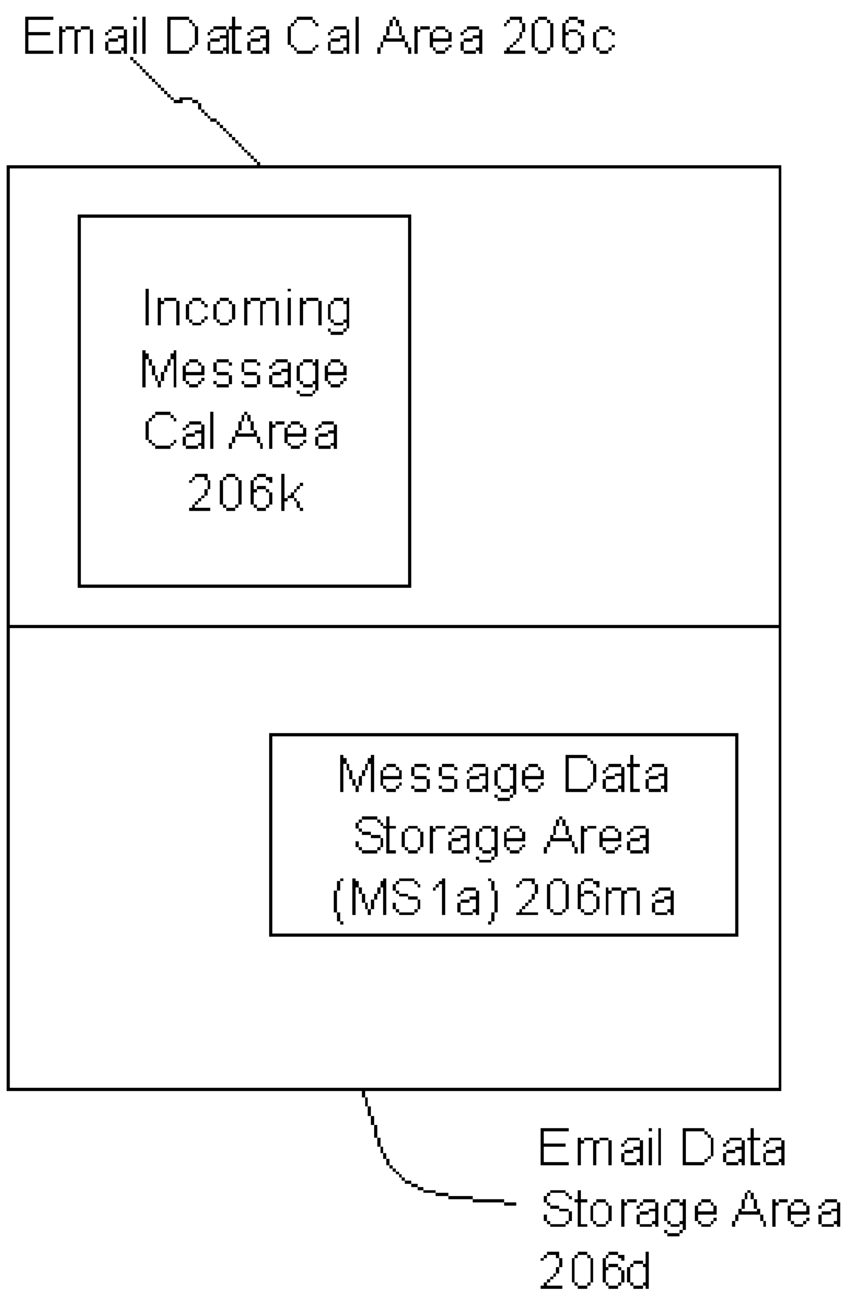

FIG. 234*a* is a block diagram illustrating an exemplary embodiment of the present invention.

Figure 234B:
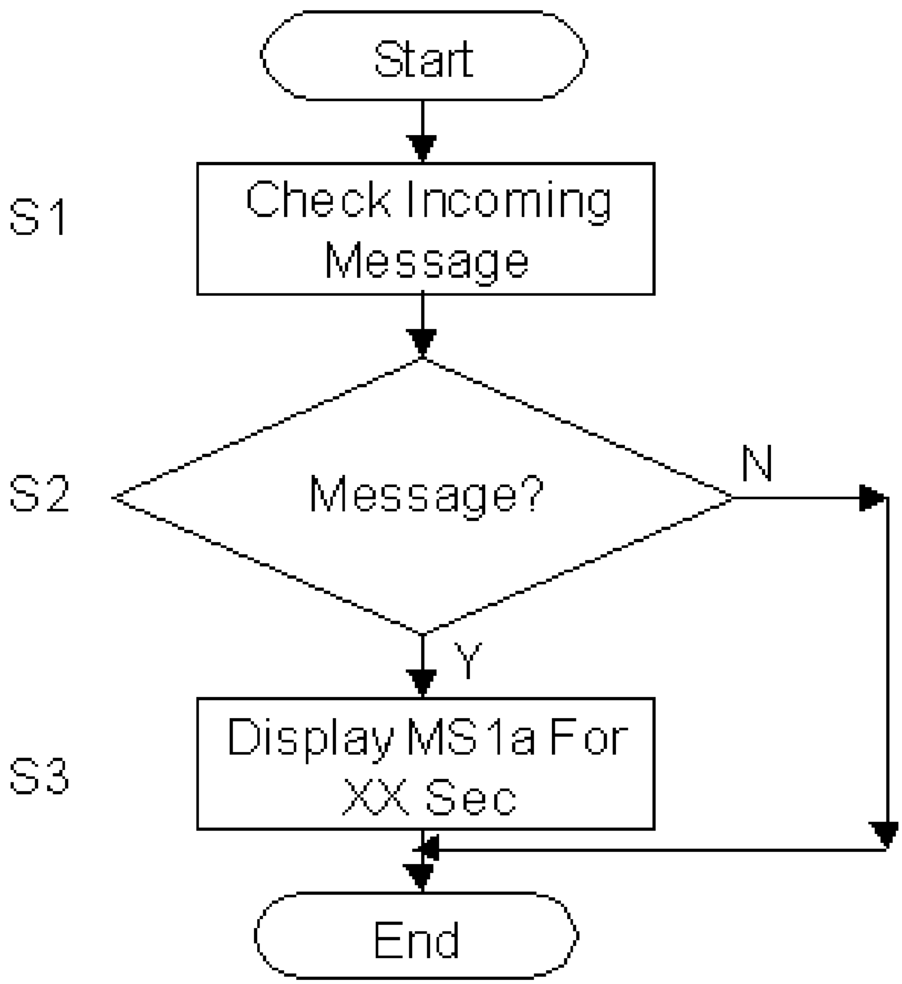

FIG. 234*b* is a flowchart illustrating an exemplary embodiment of the present invention.

Figure 235:
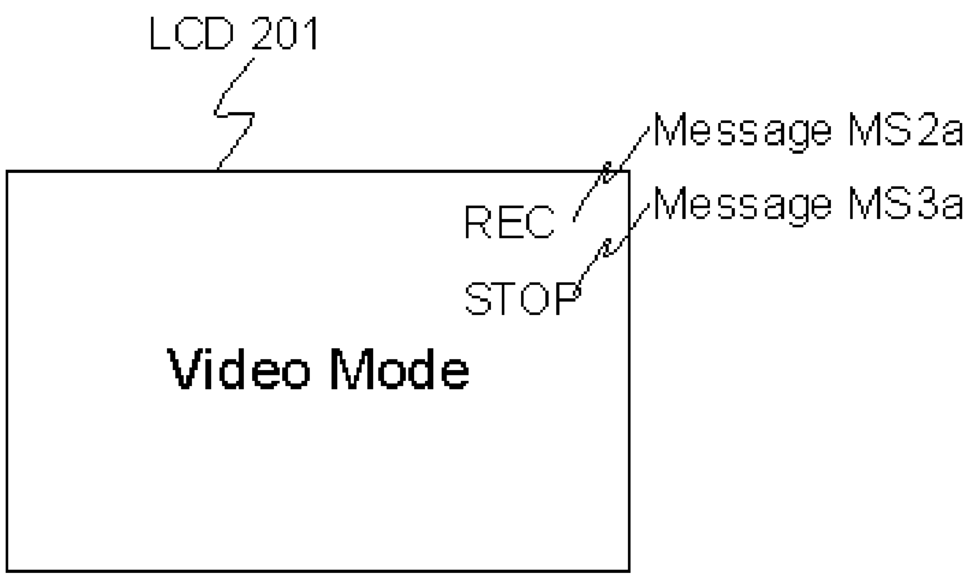

FIG. 235 is a simplified illustration illustrating an exemplary embodiment of the present invention.

Figure 236:
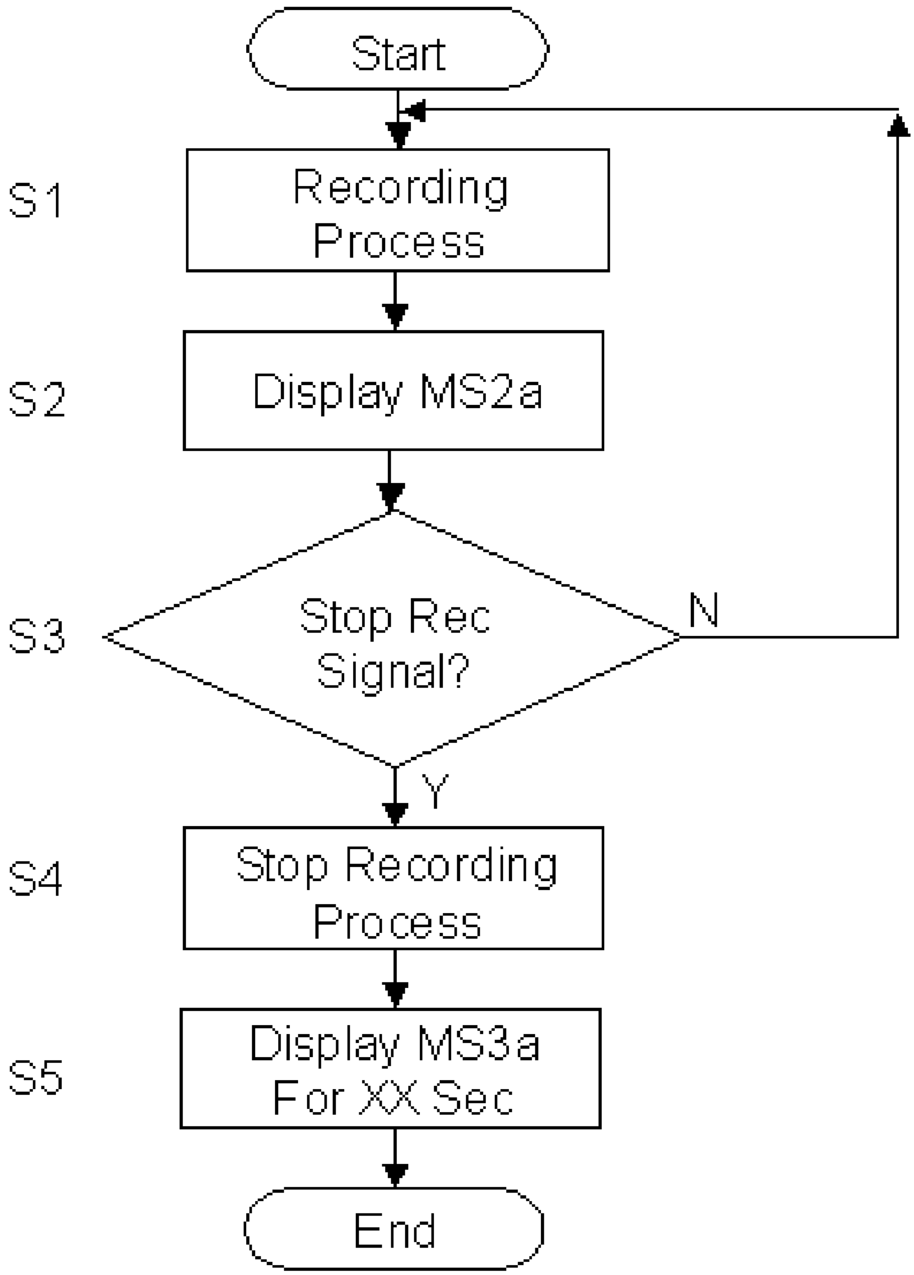

FIG. 236 is a flowchart illustrating an exemplary embodiment of the present invention.

Figure 237:
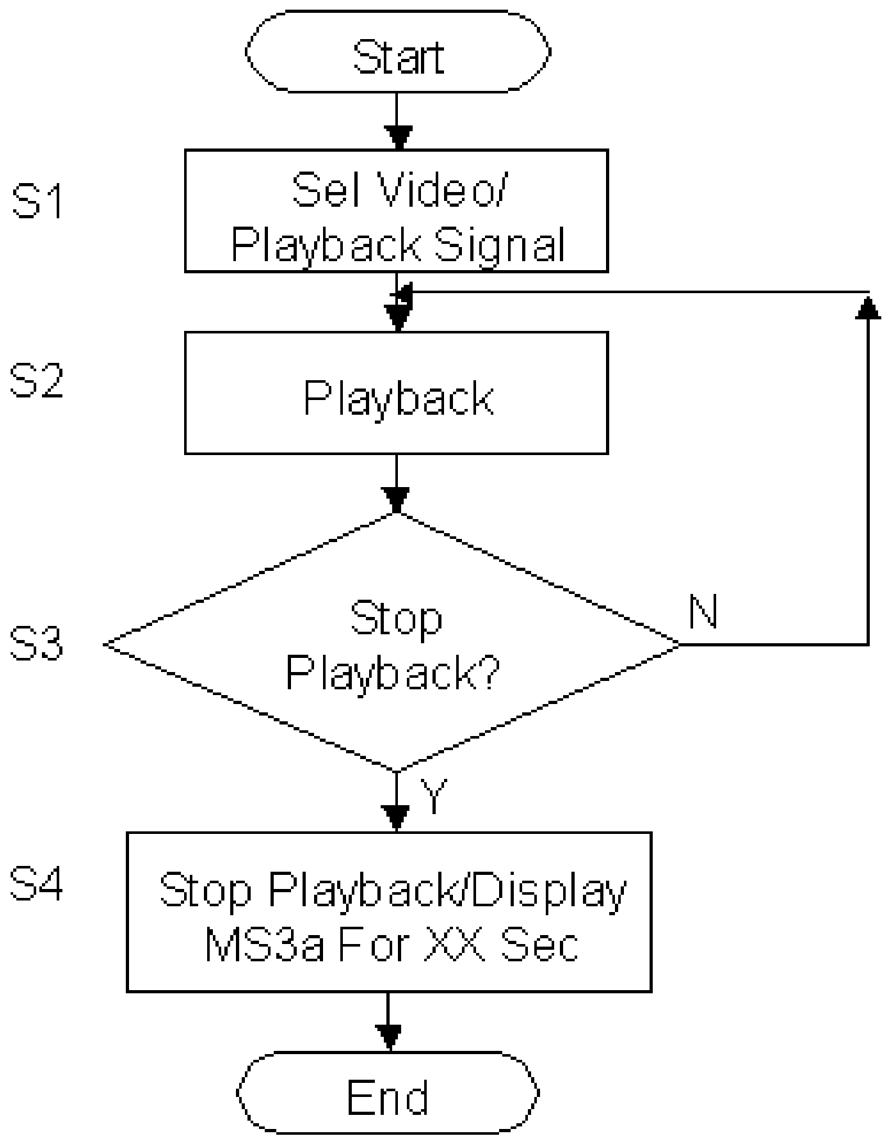

FIG. 237 is a flowchart illustrating an exemplary embodiment of the present invention.

Figure 238:
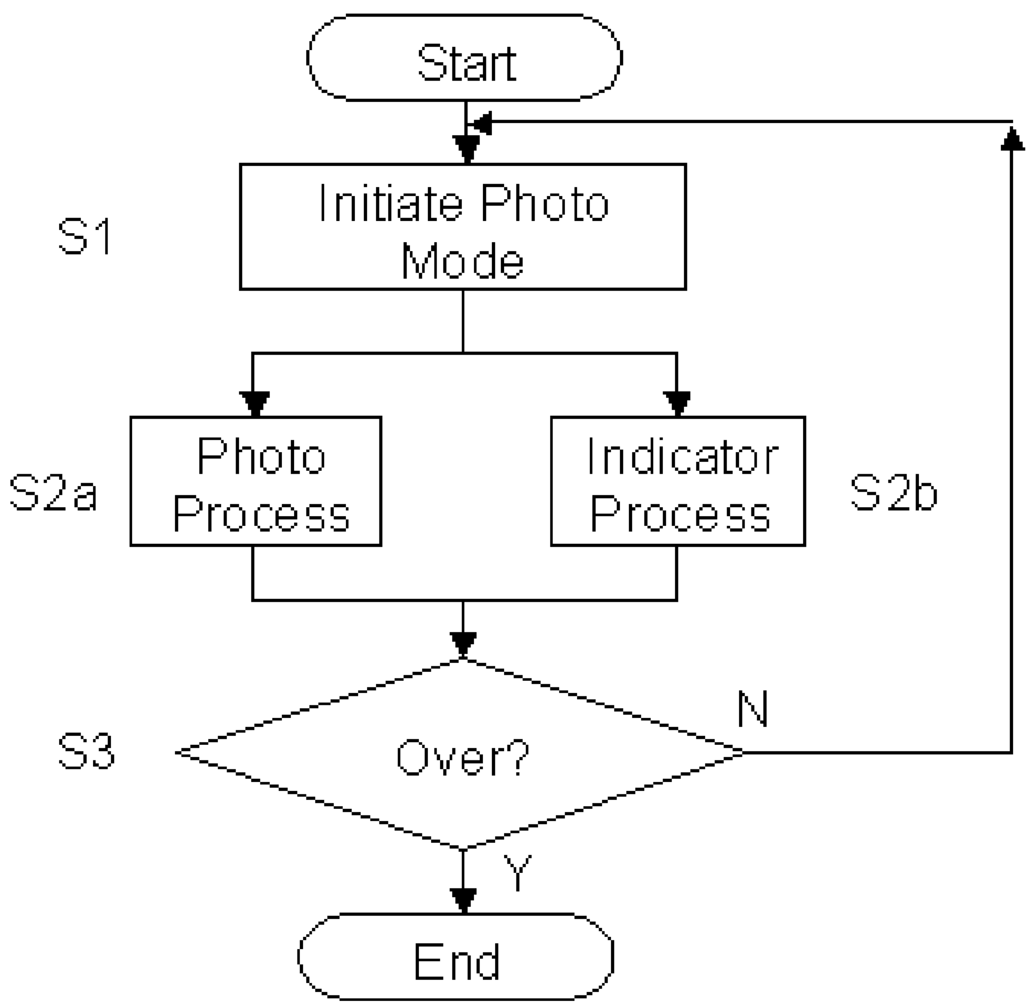

FIG. 238 is a flowchart illustrating an exemplary embodiment of the present invention.

Figure 239:
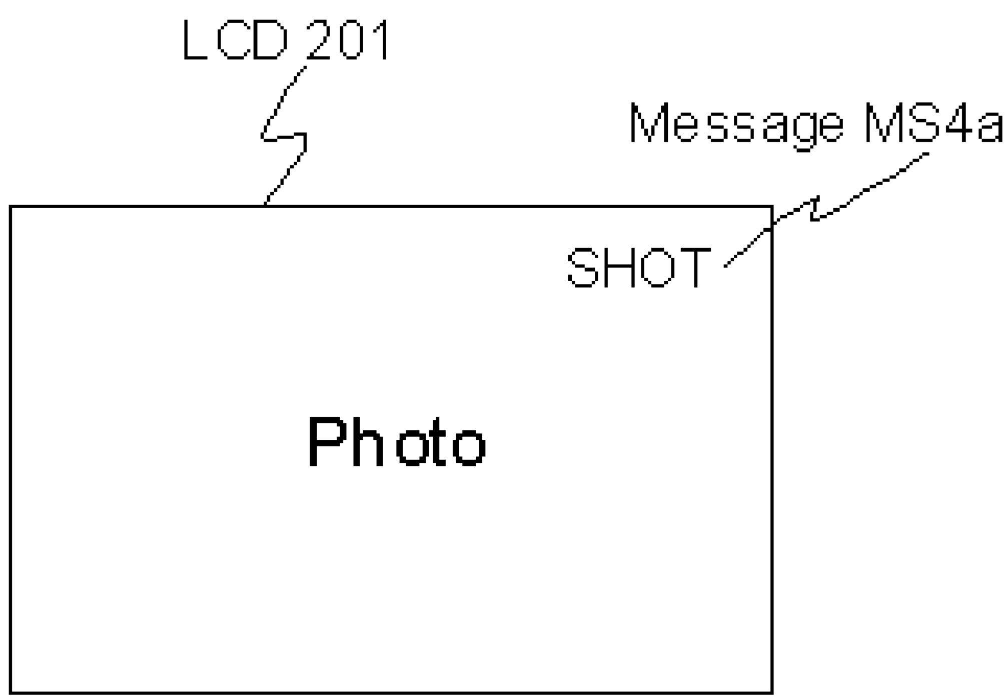

FIG. 239 is a simplified illustration illustrating an exemplary embodiment of the present invention.

Figure 240:
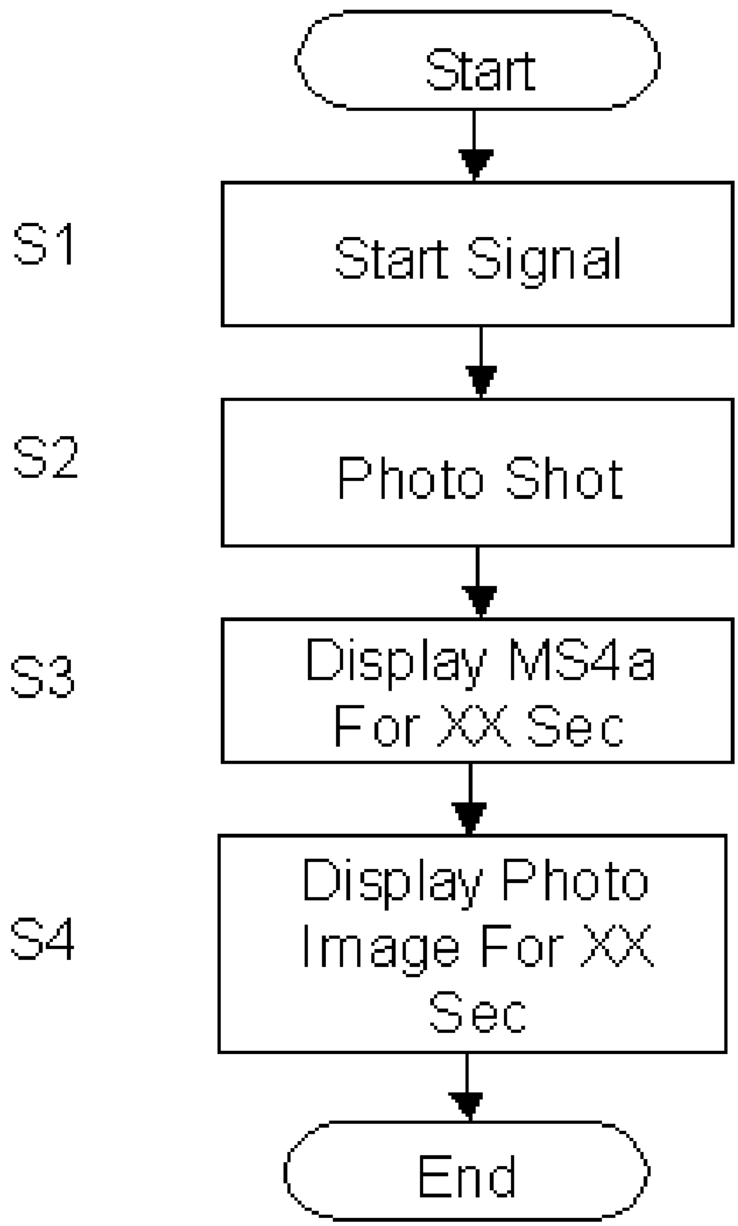

FIG. 240 is a flowchart illustrating an exemplary embodiment of the present invention.

Figure 241:
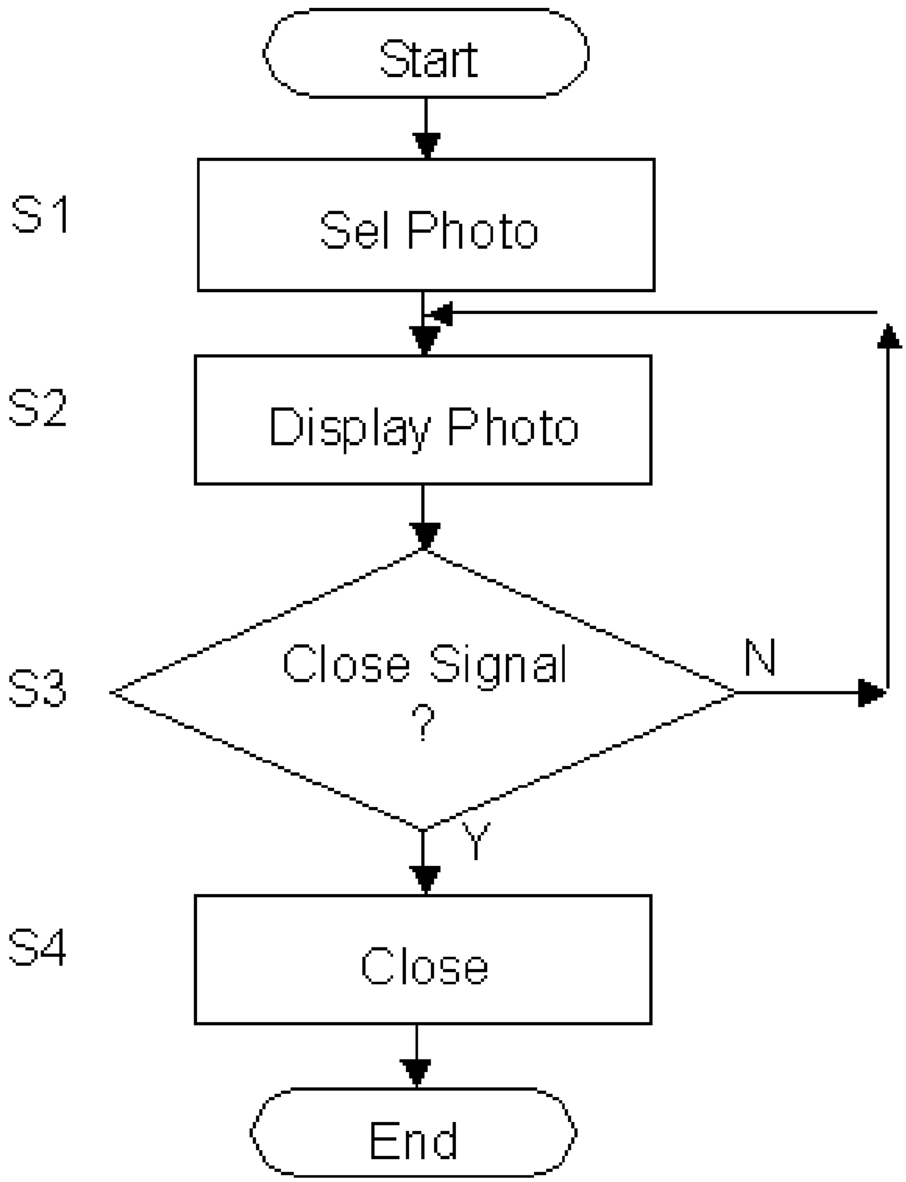

FIG. 241 is a flowchart illustrating an exemplary embodiment of the present invention.

Figure 242:
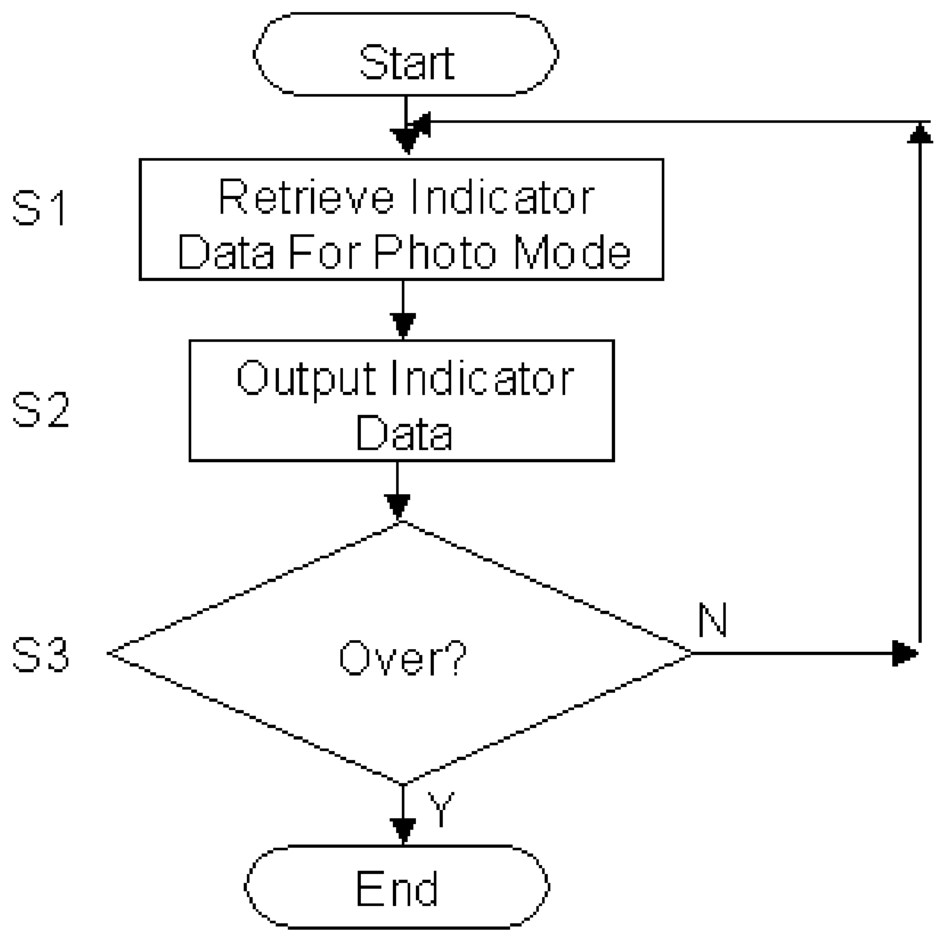

FIG. 242 is a flowchart illustrating an exemplary embodiment of the present invention.

Figure 243:
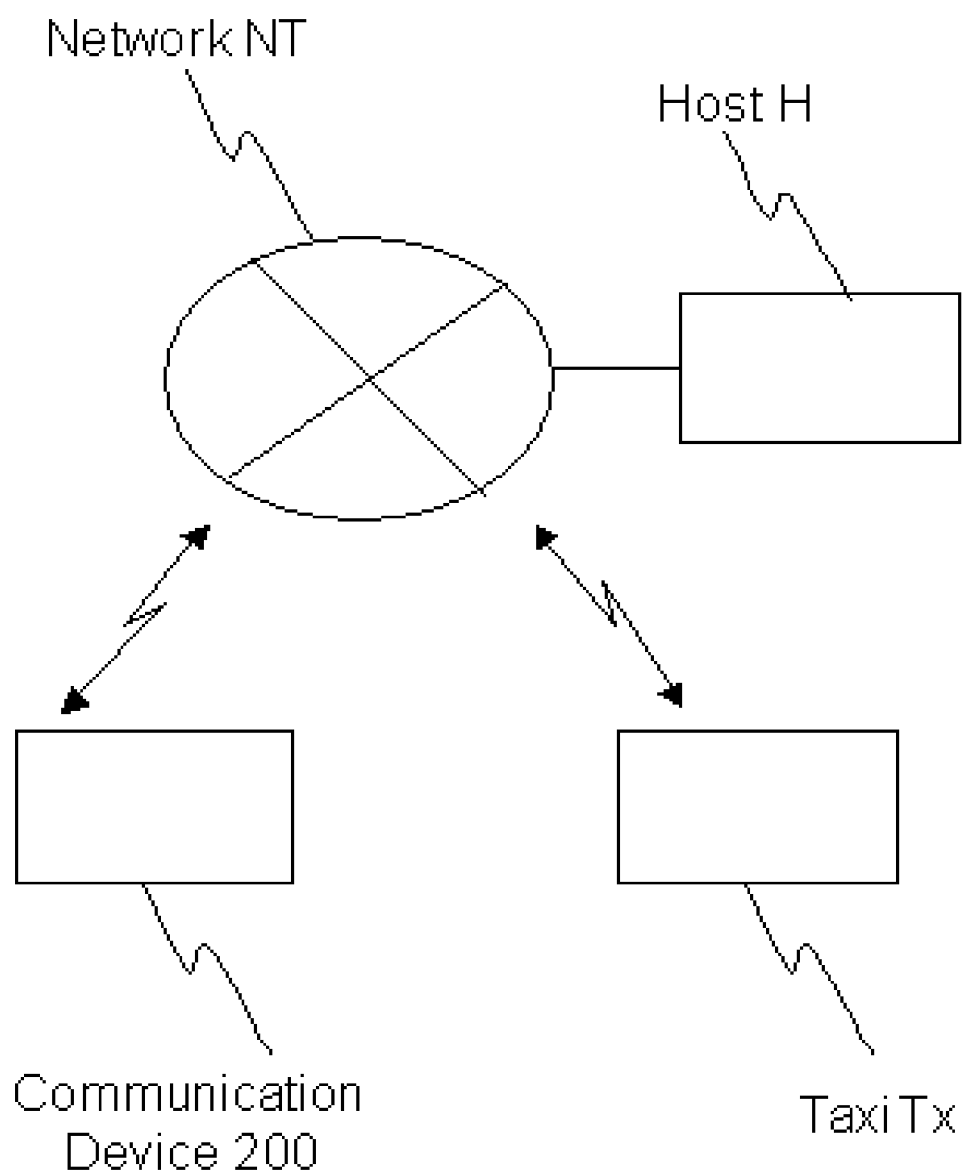

FIG. 243 is a simplified illustration illustrating an exemplary embodiment of the present invention.

Figure 243A:
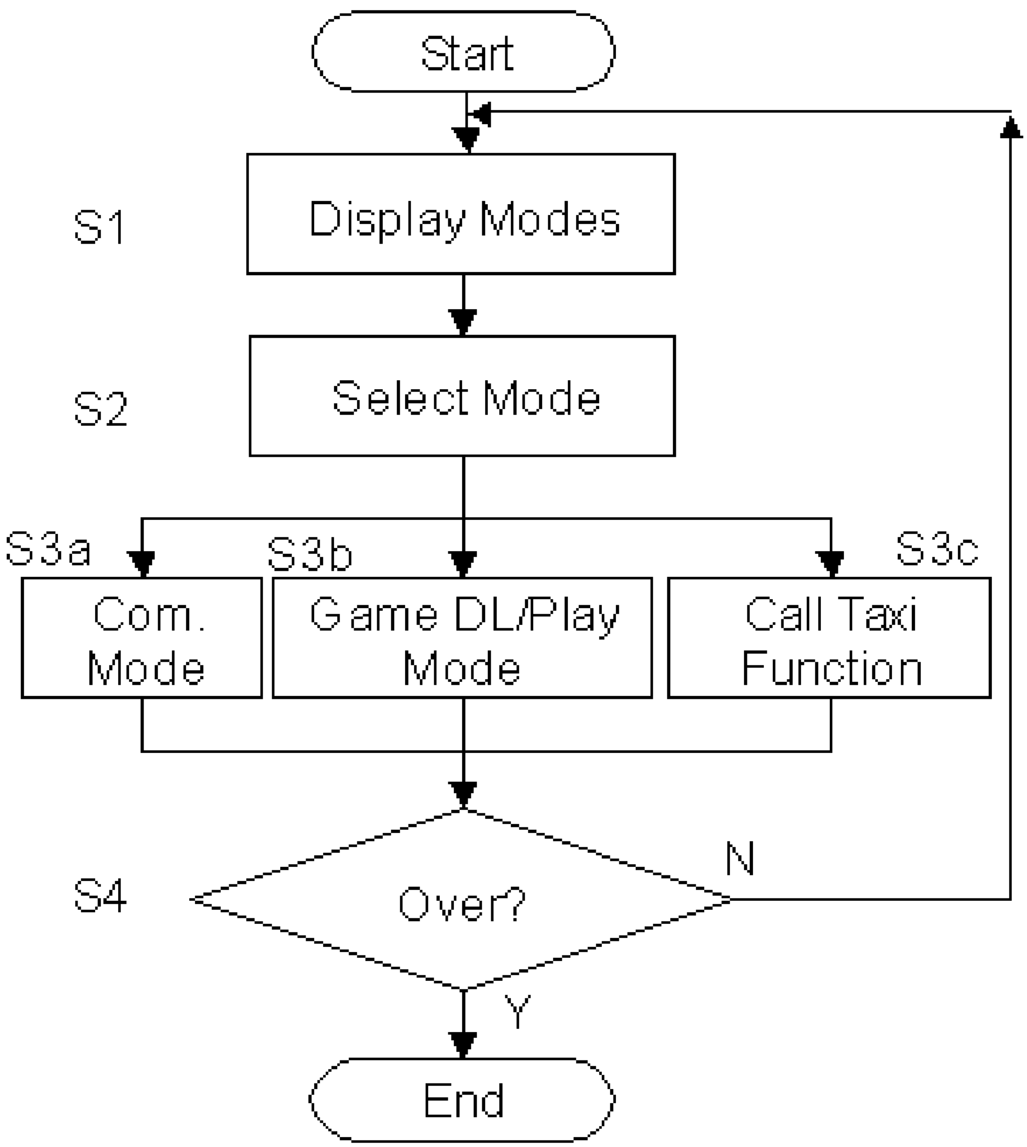

FIG. 243*a* is a flowchart illustrating an exemplary embodiment of the present invention.

Figure 243B:
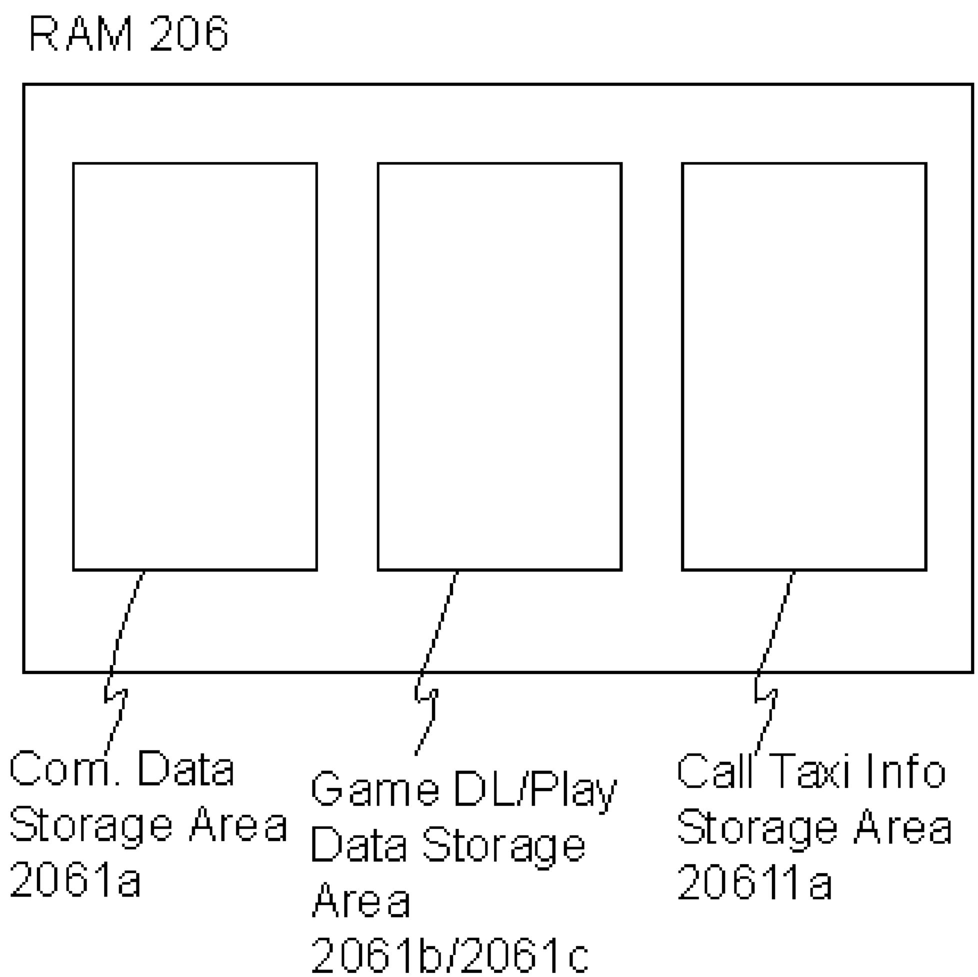

FIG. 243*b* is a block diagram illustrating an exemplary embodiment of the present invention.

Figure 243C:
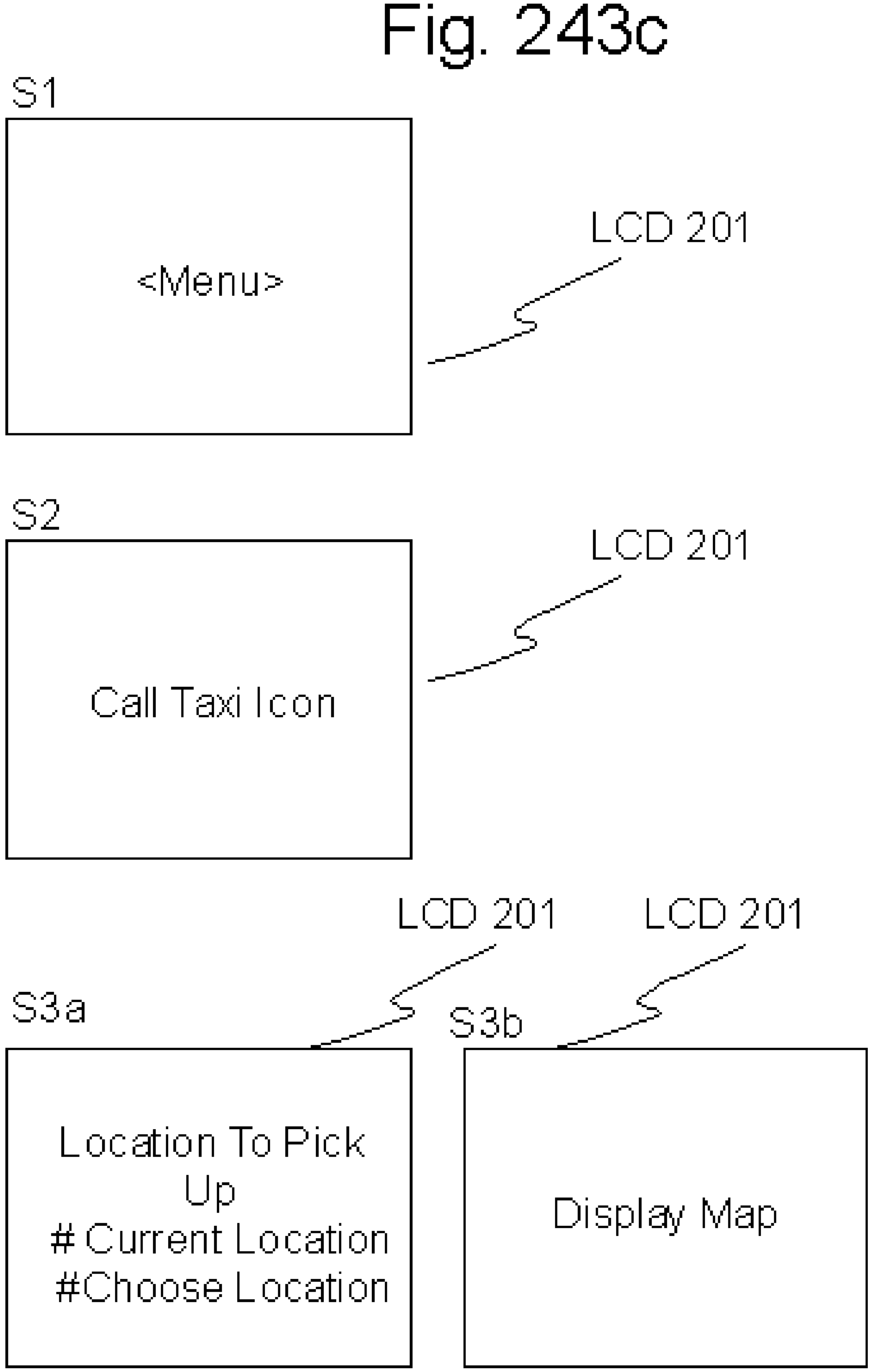

FIG. 243*c* is a simplified illustration of contents and items shown on display.

Figure 243D:
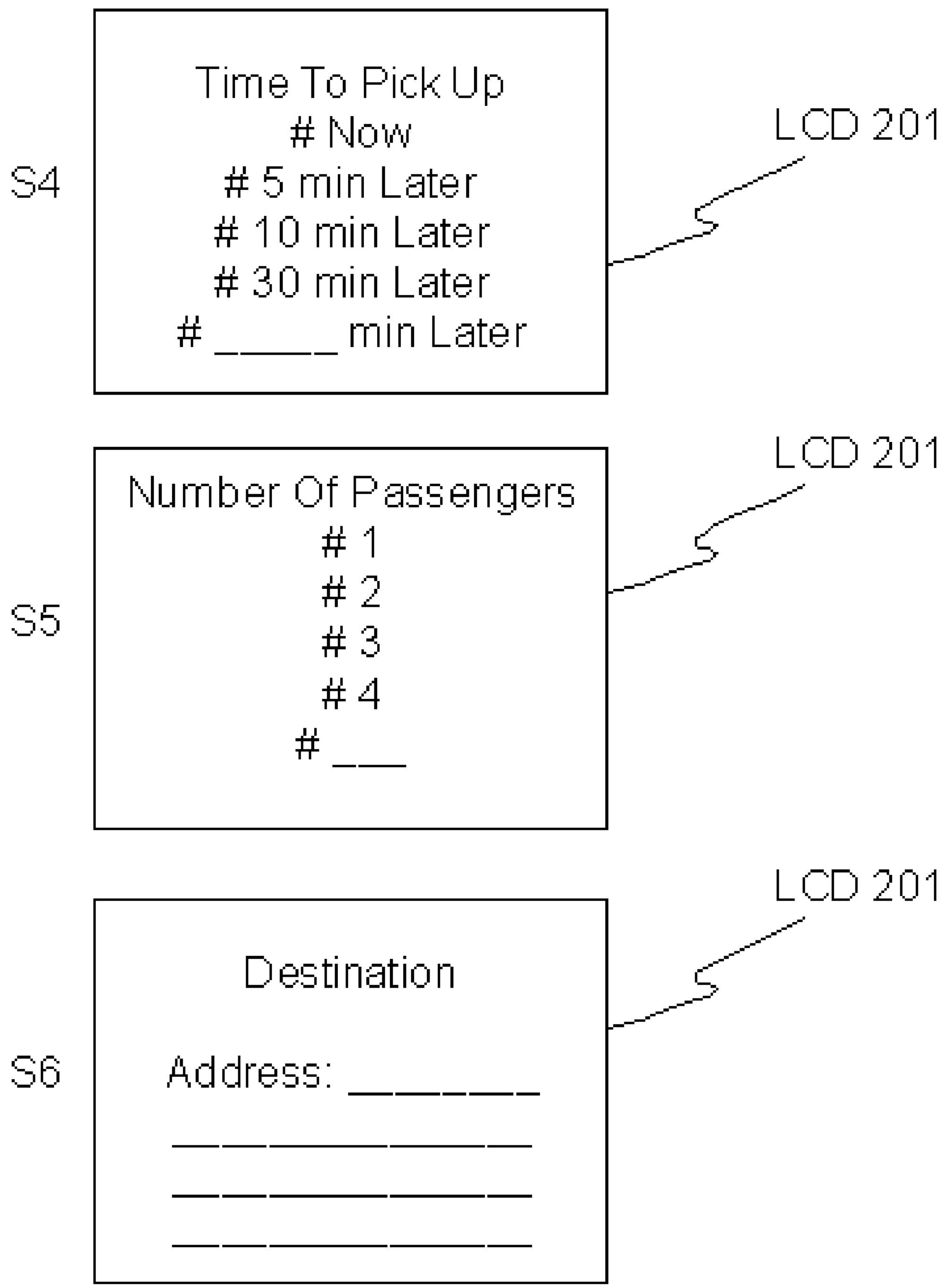

FIG. 243*d* is a simplified illustration of contents and items shown on display.

Figure 243E:
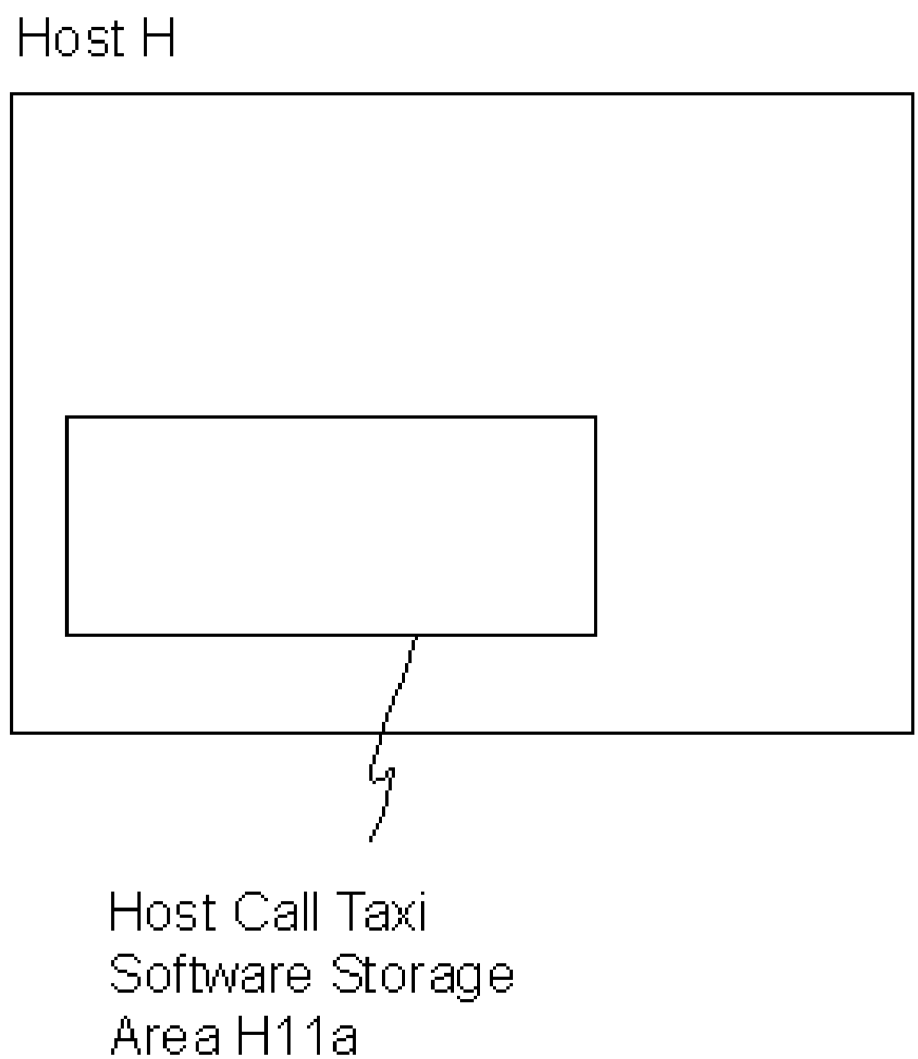

FIG. 243*e* is a block diagram illustrating an exemplary embodiment of the present invention.

Figure 244:
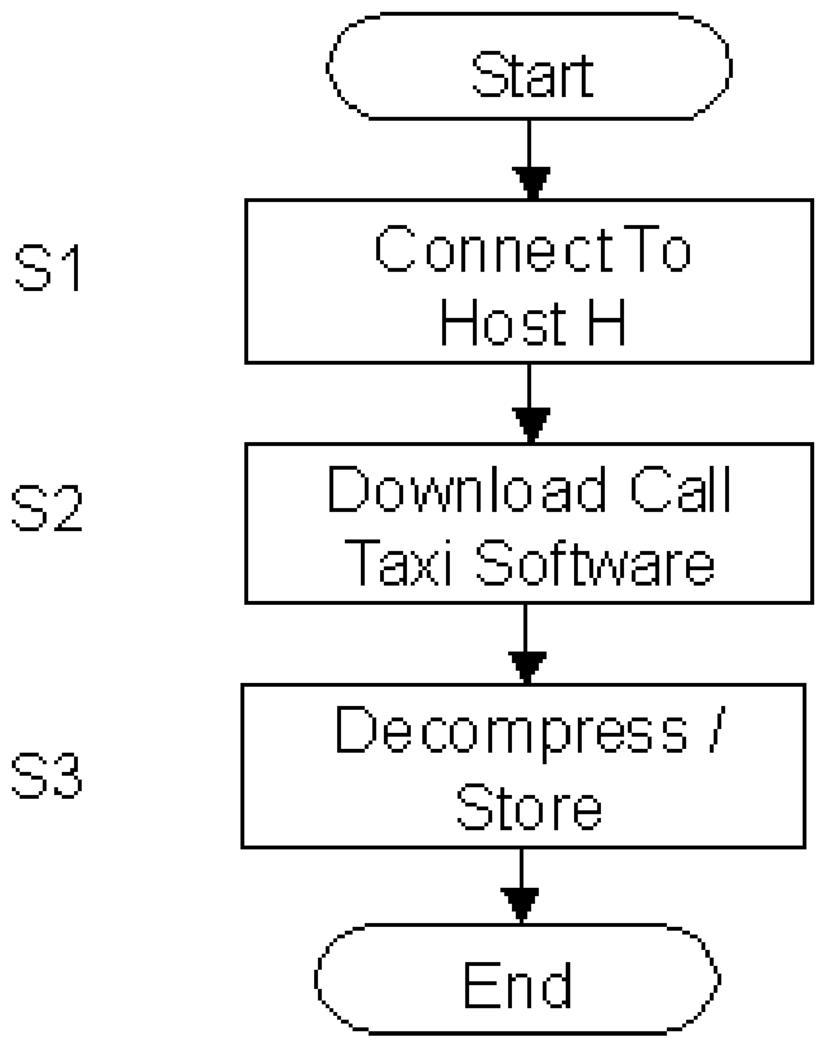

FIG. 244 is a flowchart illustrating an exemplary embodiment of the present invention.

Figure 244A:
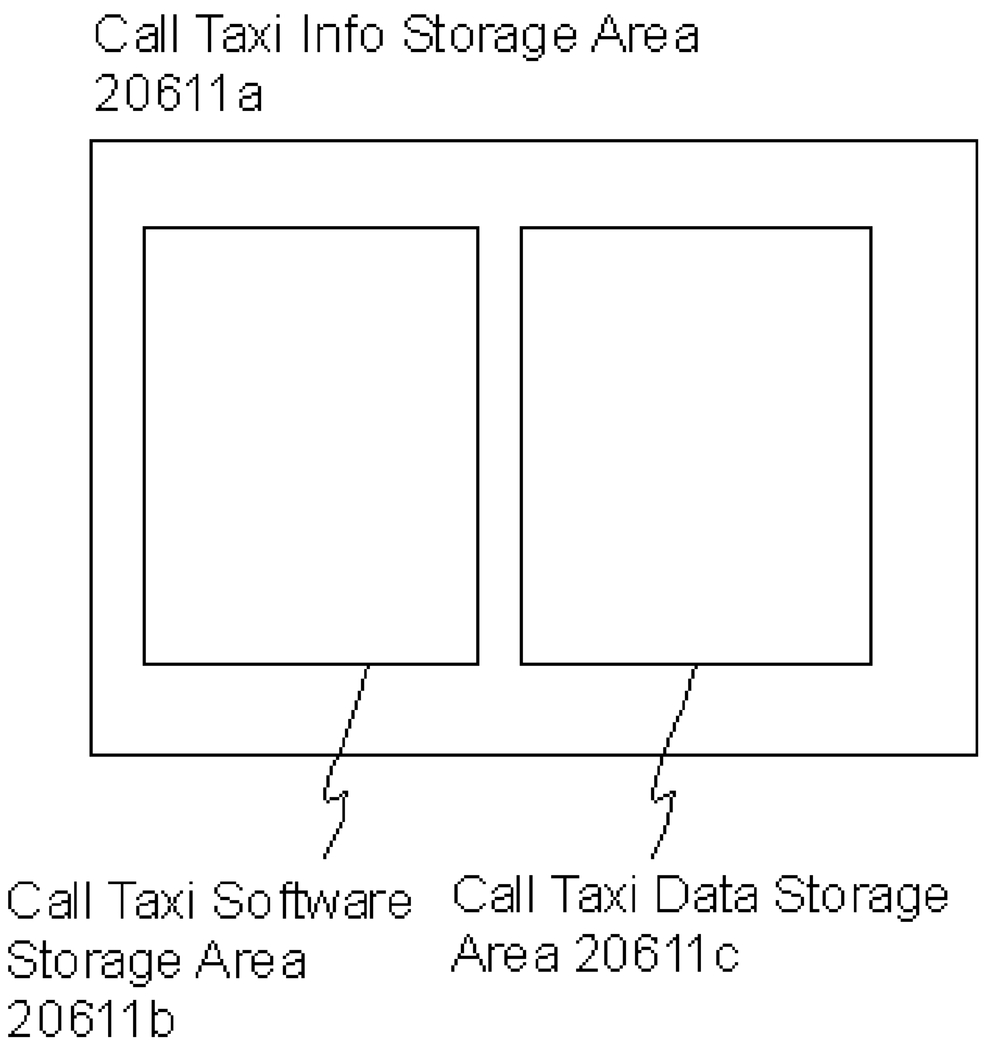

FIG. 244*a* is a block diagram illustrating an exemplary embodiment of the present invention.

Figure 245:
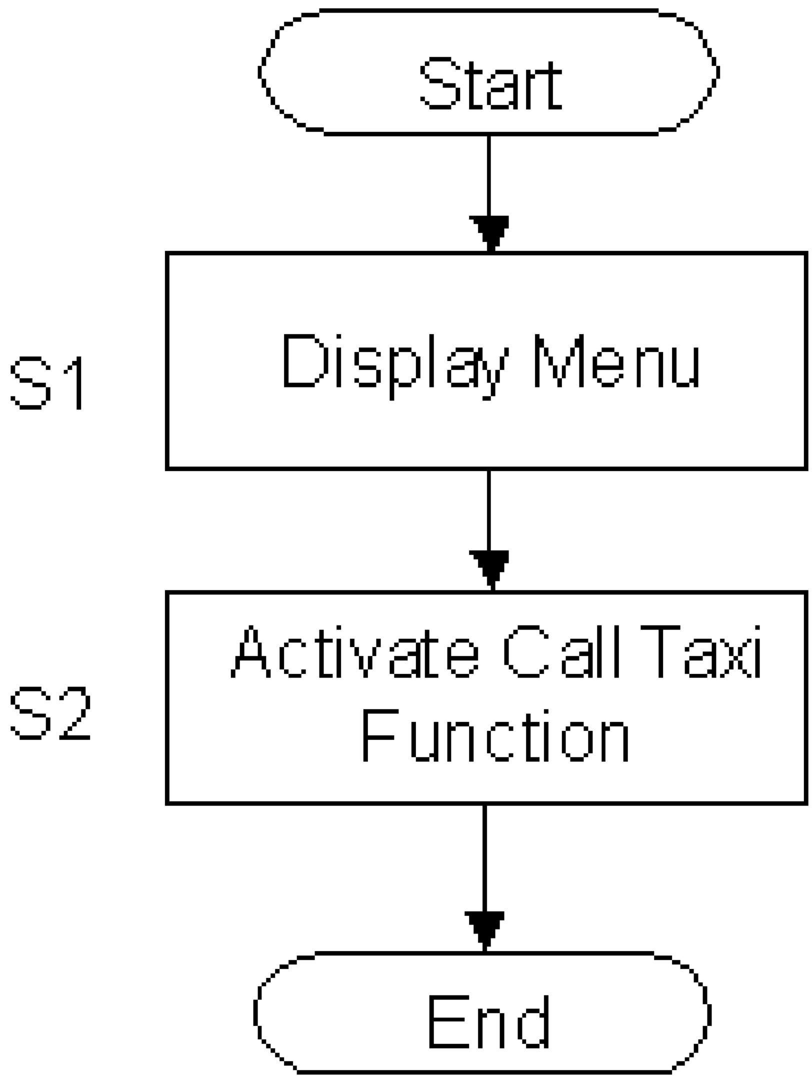

FIG. 245 is a flowchart illustrating an exemplary embodiment of the present invention.

Figure 246:
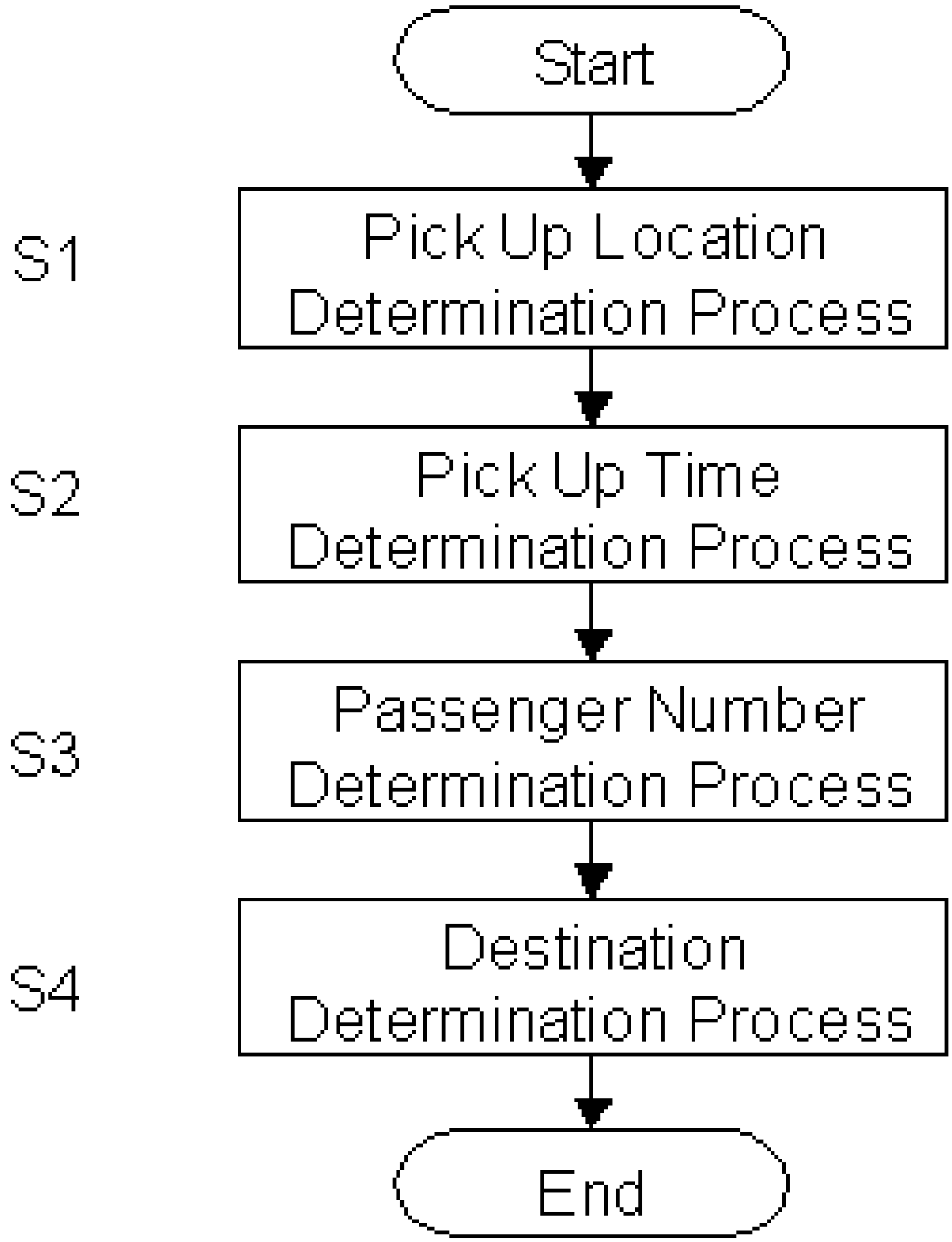

FIG. 246 is a flowchart illustrating an exemplary embodiment of the present invention.

Figure 247:
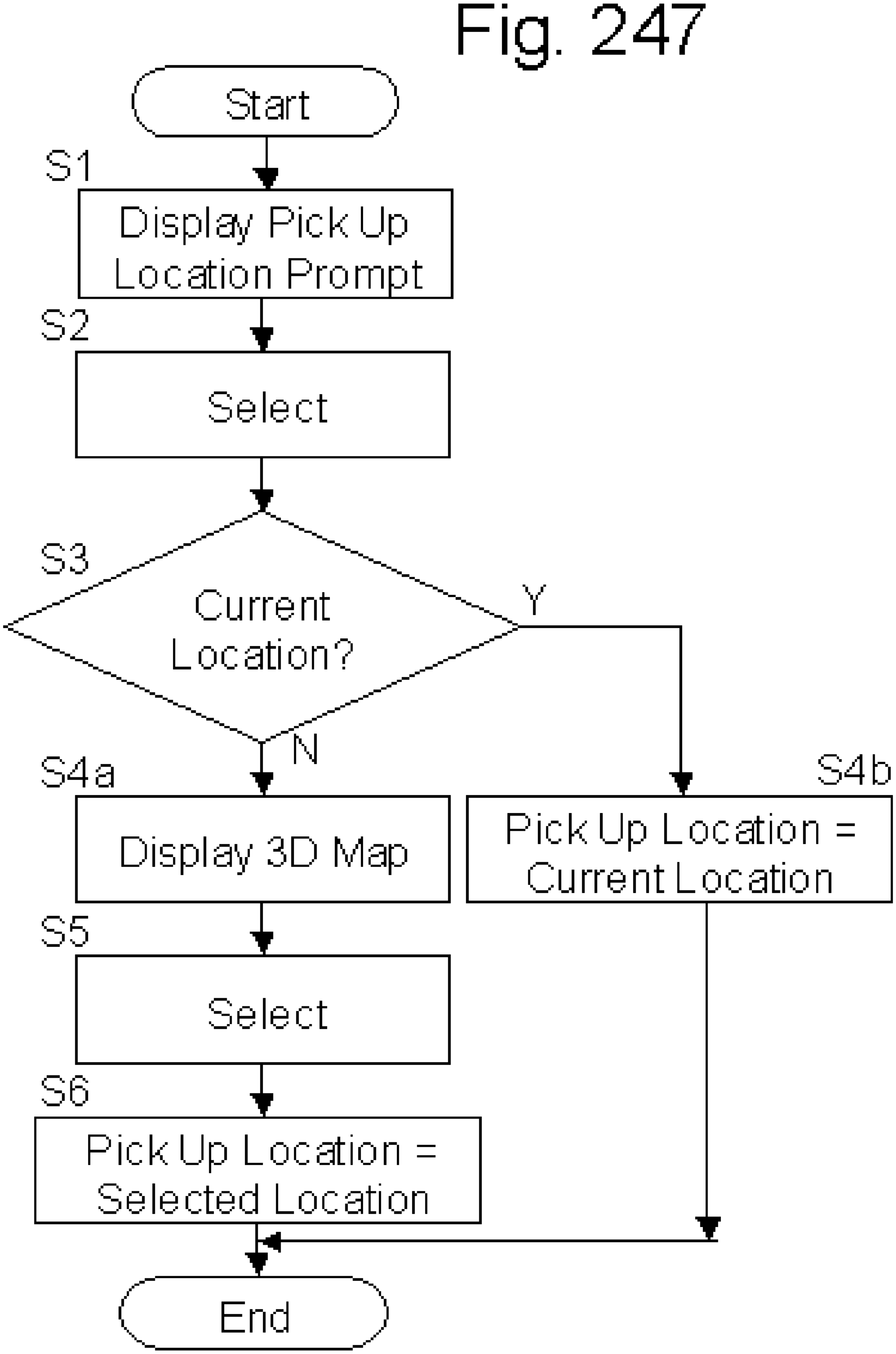

FIG. 247 is a flowchart illustrating an exemplary embodiment of the present invention.

Figure 248:
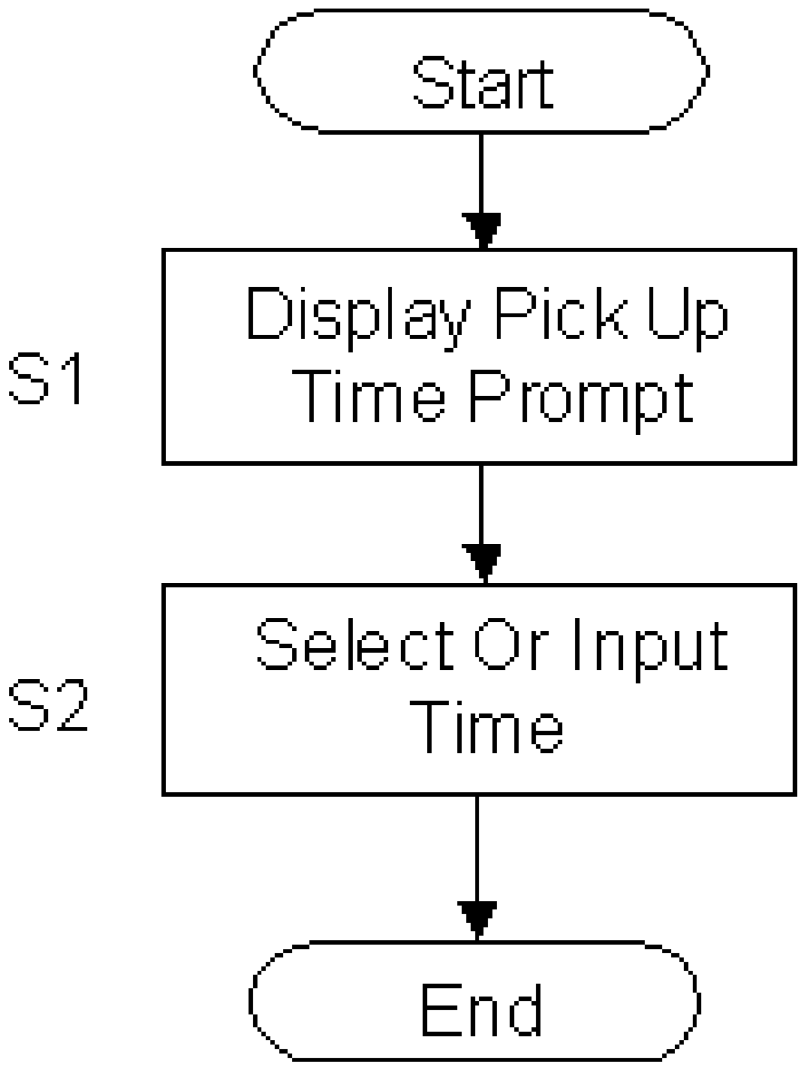

FIG. 248 is a flowchart illustrating an exemplary embodiment of the present invention.

Figure 249:
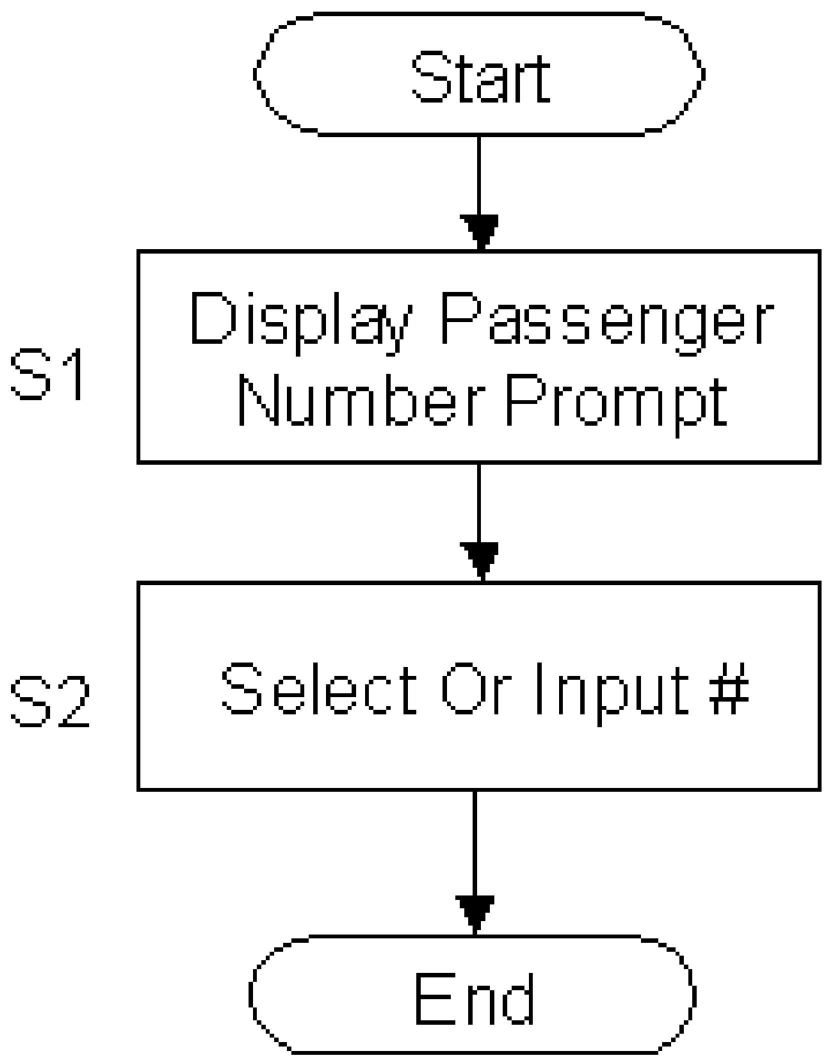

FIG. 249 is a flowchart illustrating an exemplary embodiment of the present invention.

Figure 250:
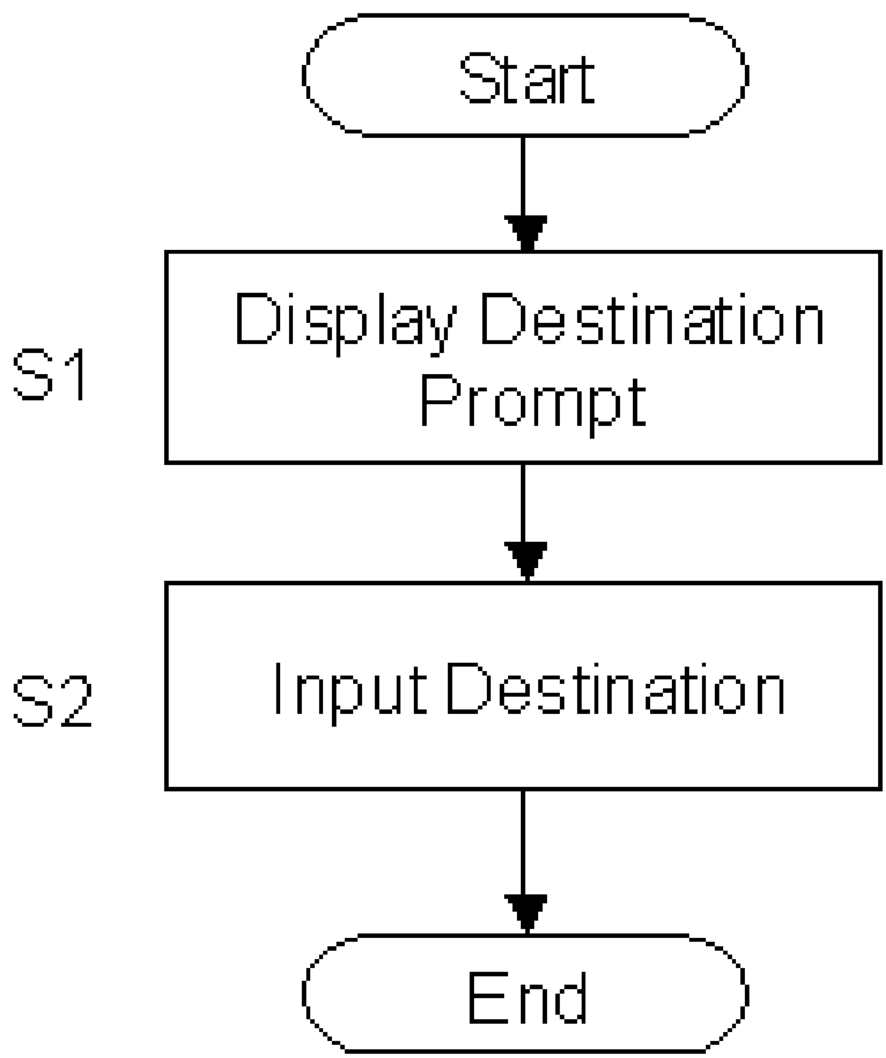

FIG. 250 is a flowchart illustrating an exemplary embodiment of the present invention.

Figure 251:
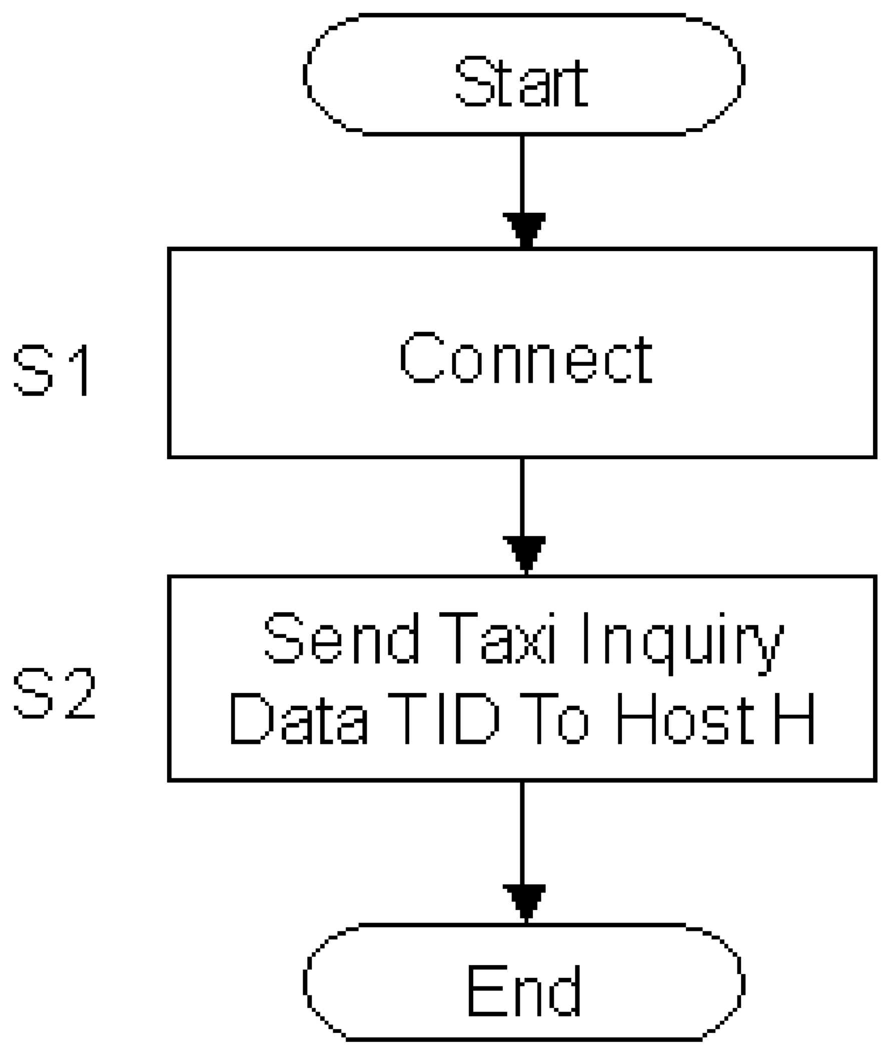

FIG. 251 is a flowchart illustrating an exemplary embodiment of the present invention.

Figure 252:
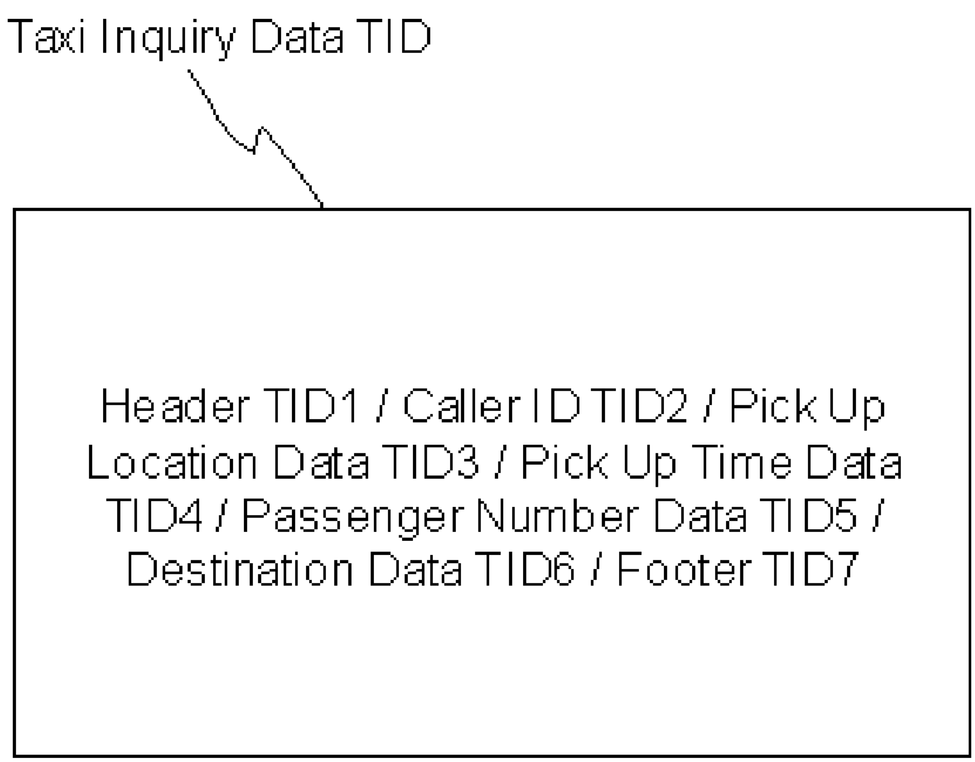

FIG. 252 is a simplified illustration of data utilized in the present invention.

Figure 253:
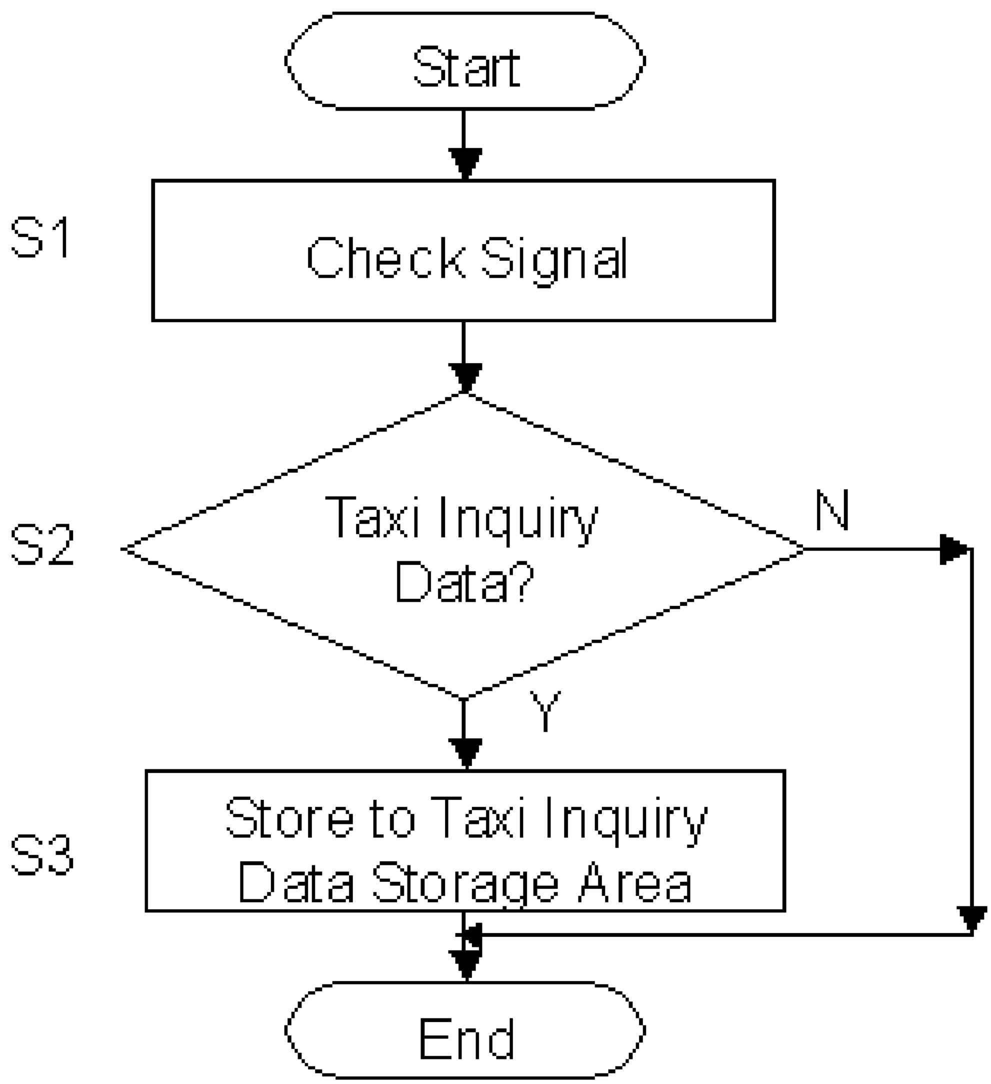

FIG. 253 is a flowchart illustrating an exemplary embodiment of the present invention.

Figure 254A:
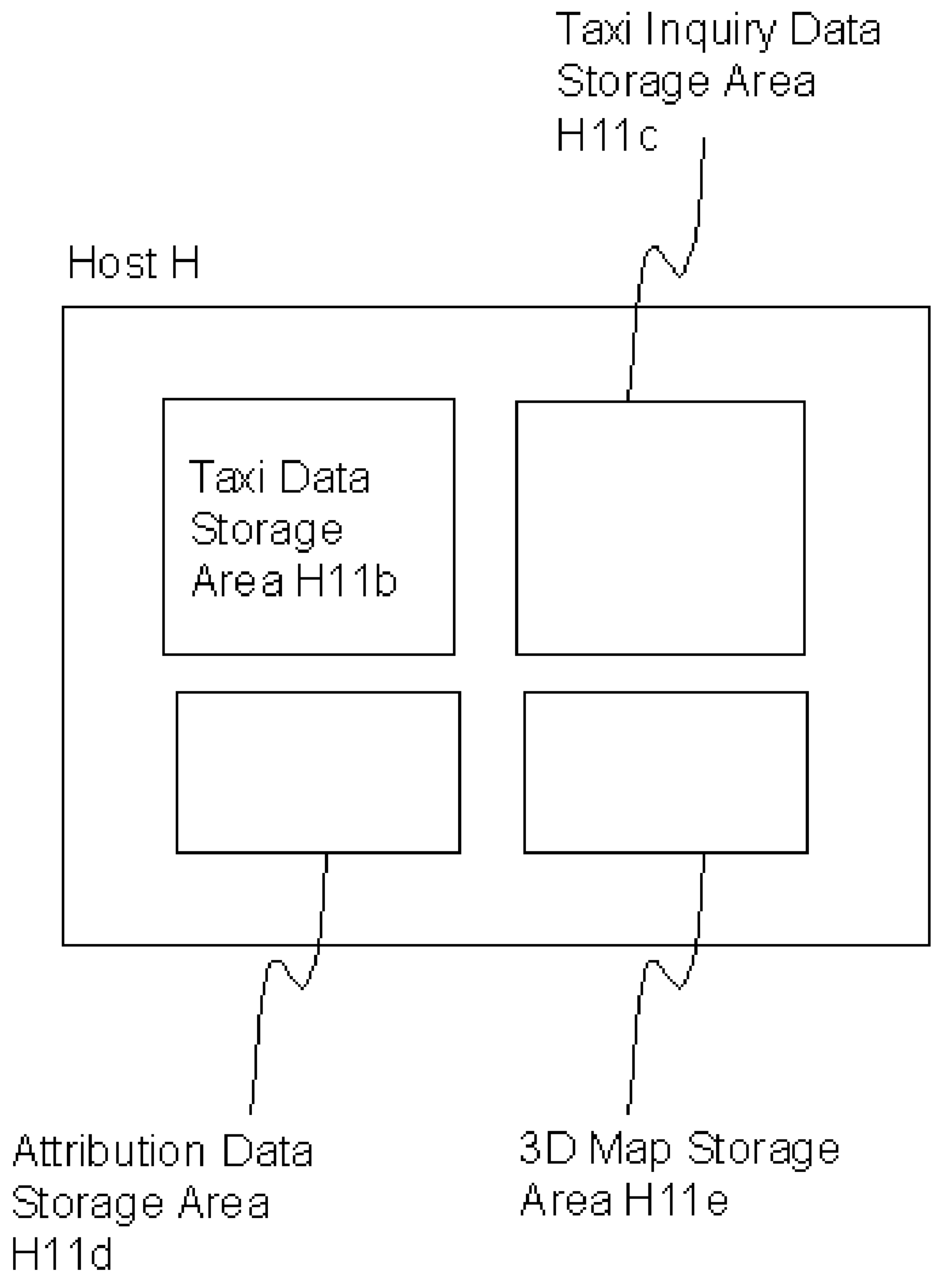

FIG. 254*a* is a block diagram illustrating an exemplary embodiment of the present invention.

FIG. 254*b* is a block diagram illustrating an exemplary embodiment of the present invention.

Figure 255:
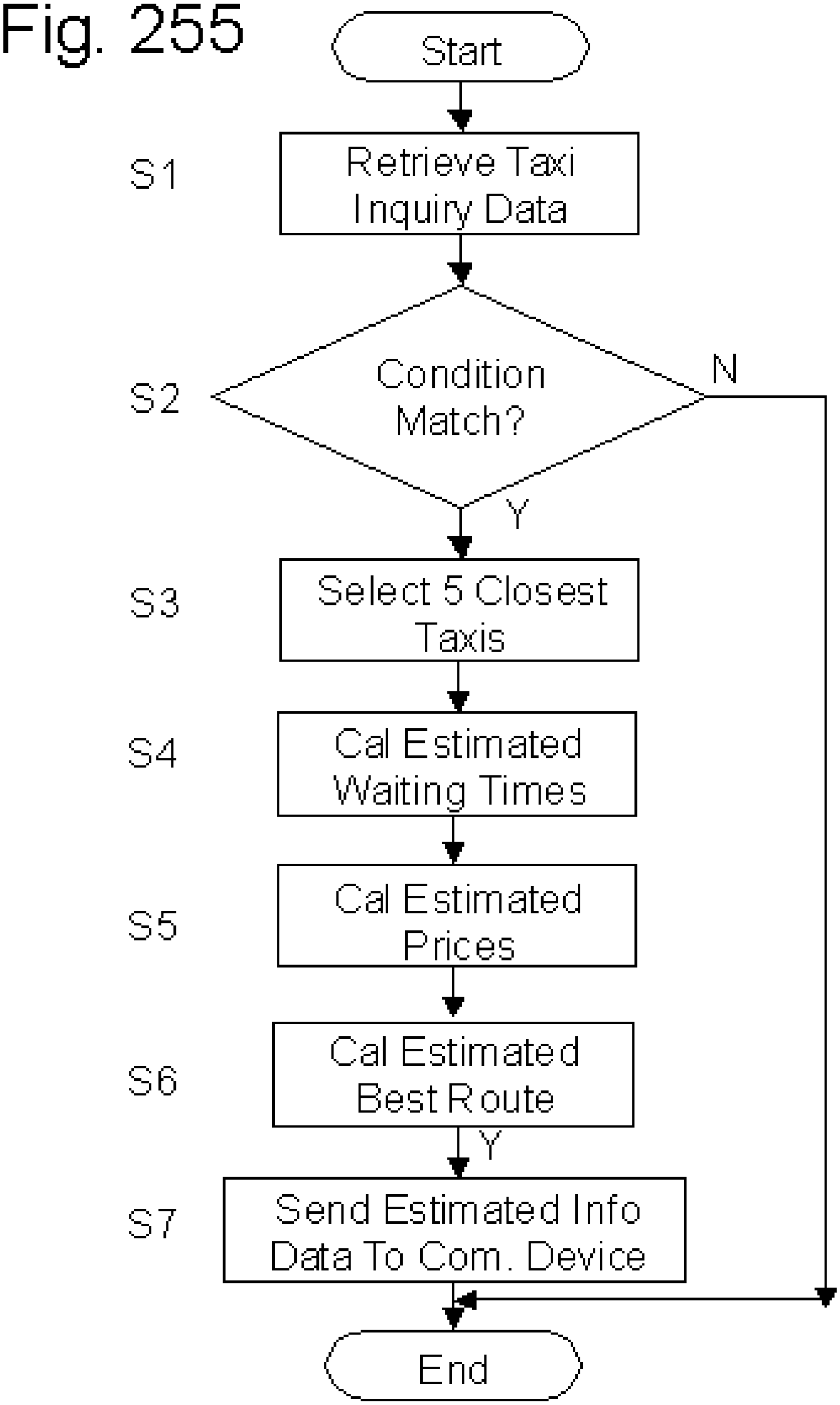

FIG. 255 is a flowchart illustrating an exemplary embodiment of the present invention.

Figure 255A:
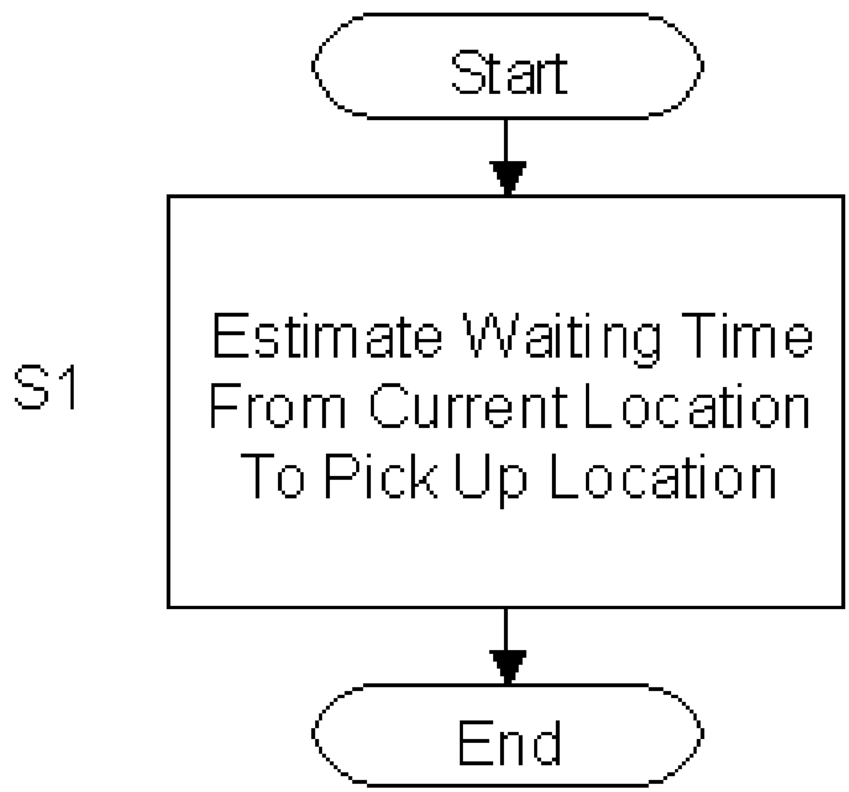

FIG. 255*a* is a flowchart illustrating an exemplary embodiment of the present invention.

Figure 255B:
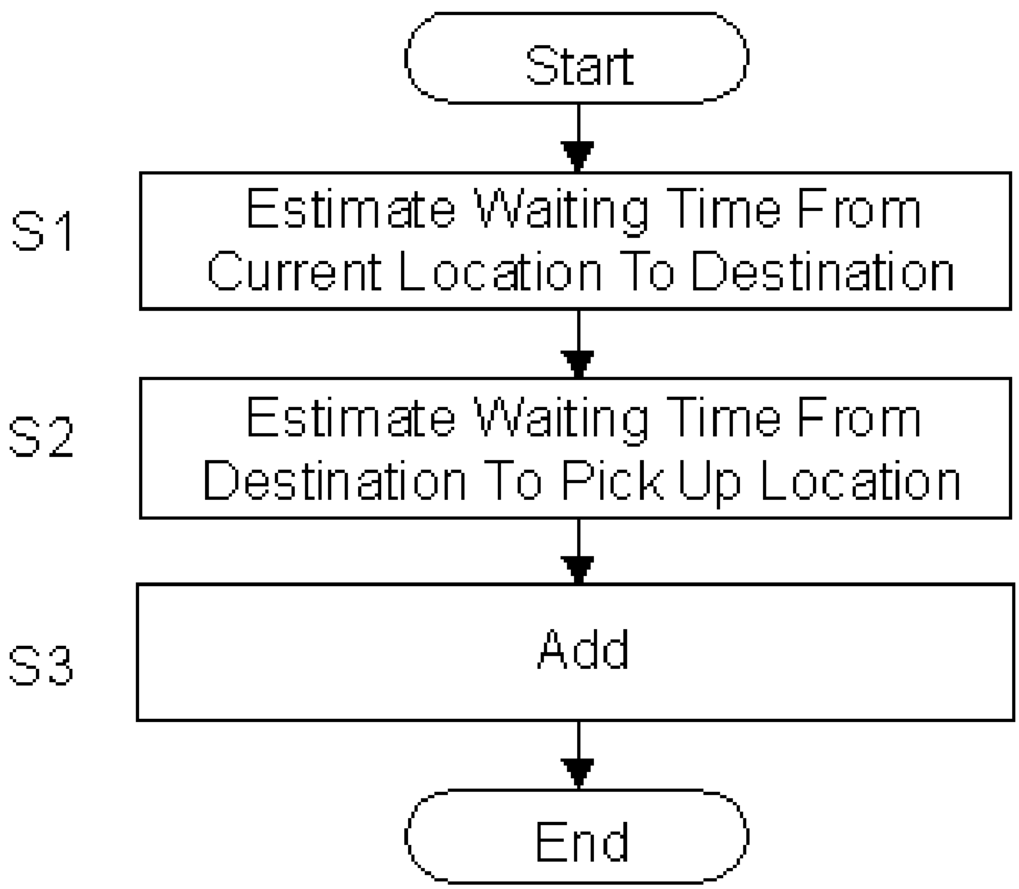

FIG. 255*b* is a flowchart illustrating an exemplary embodiment of the present invention.

FIG. 256 is a simplified illustration of data utilized in the present invention.

Figure 257:
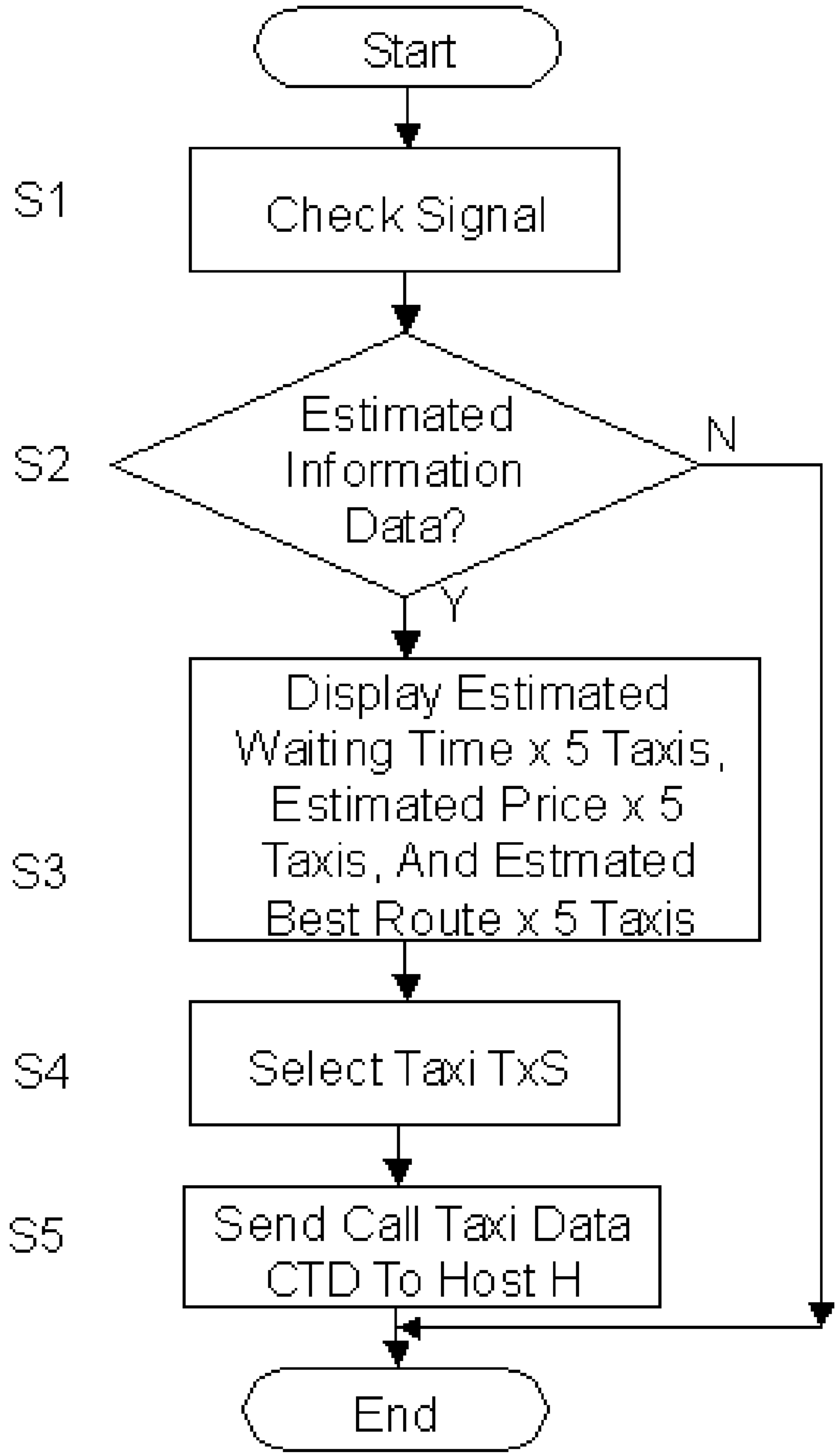

FIG. 257 is a flowchart illustrating an exemplary embodiment of the present invention.

Figure 257A:
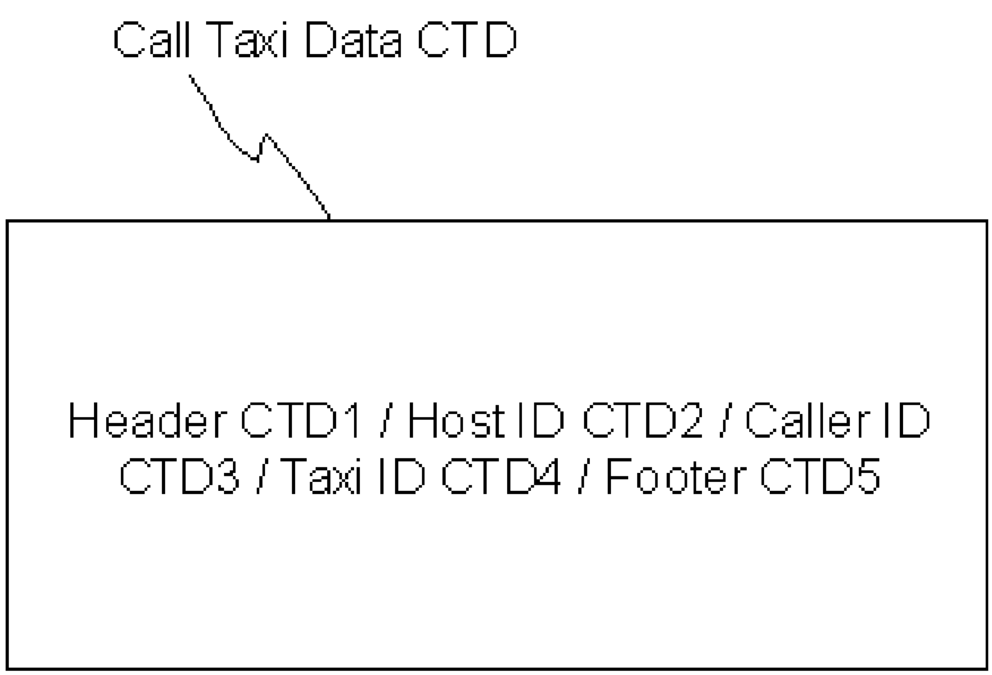

FIG. 257*a* is a simplified illustration of data utilized in the present invention.

Figure 258:
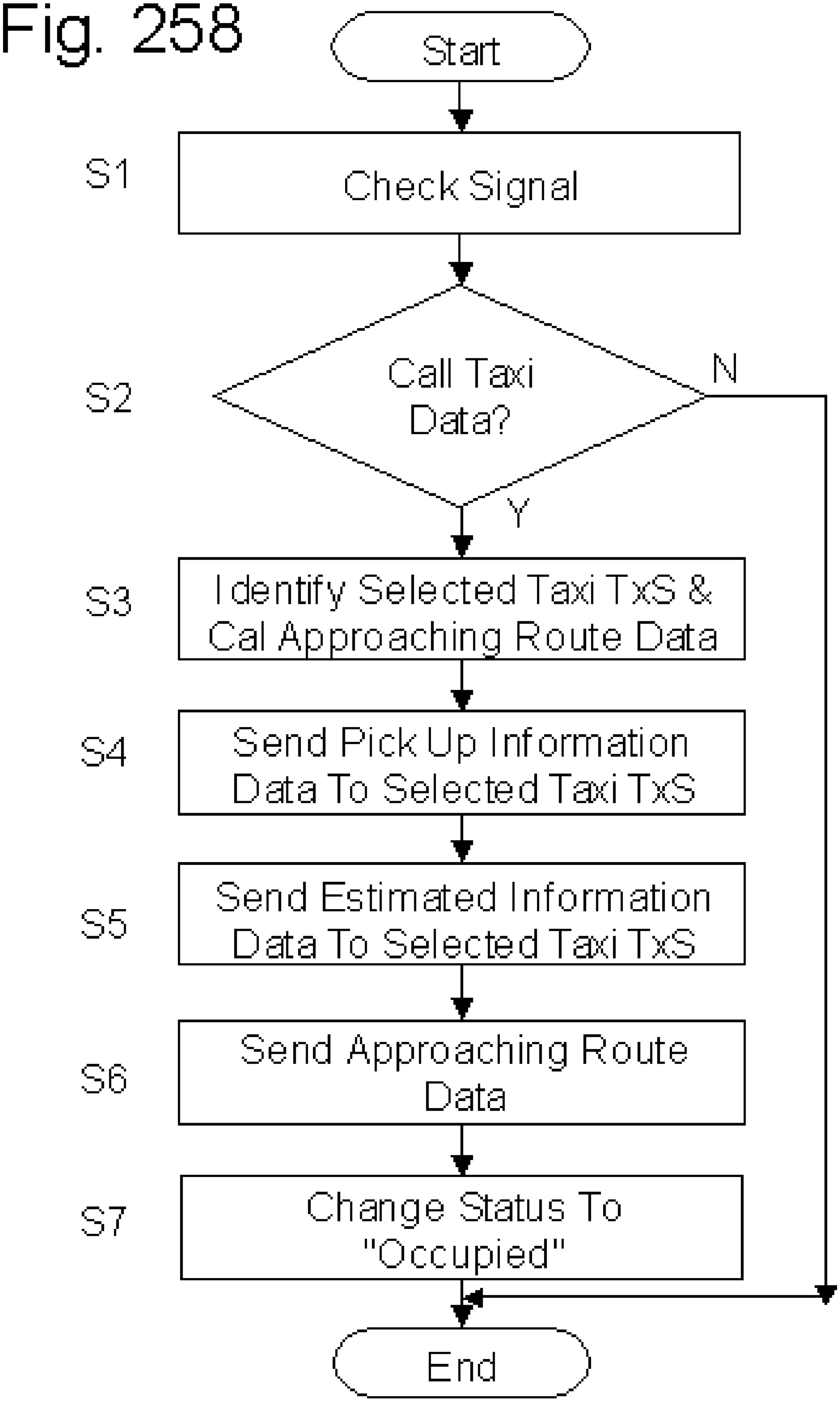

FIG. 258 is a flowchart illustrating an exemplary embodiment of the present invention.

Figure 259A:
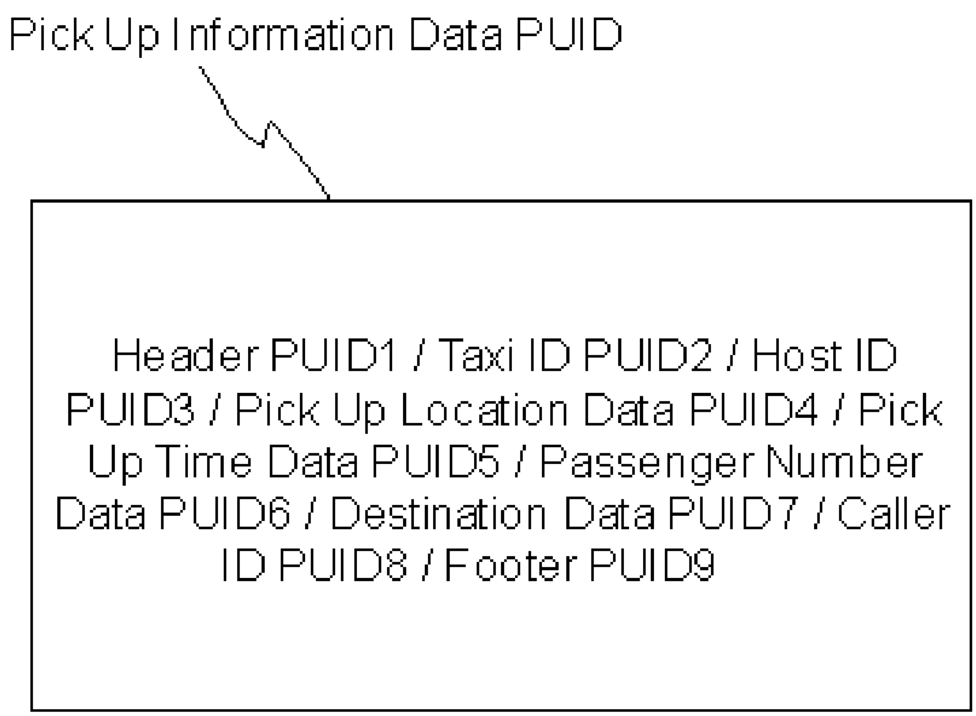

FIG. 259*a* is a simplified illustration of data utilized in the present invention.

Figure 259B:
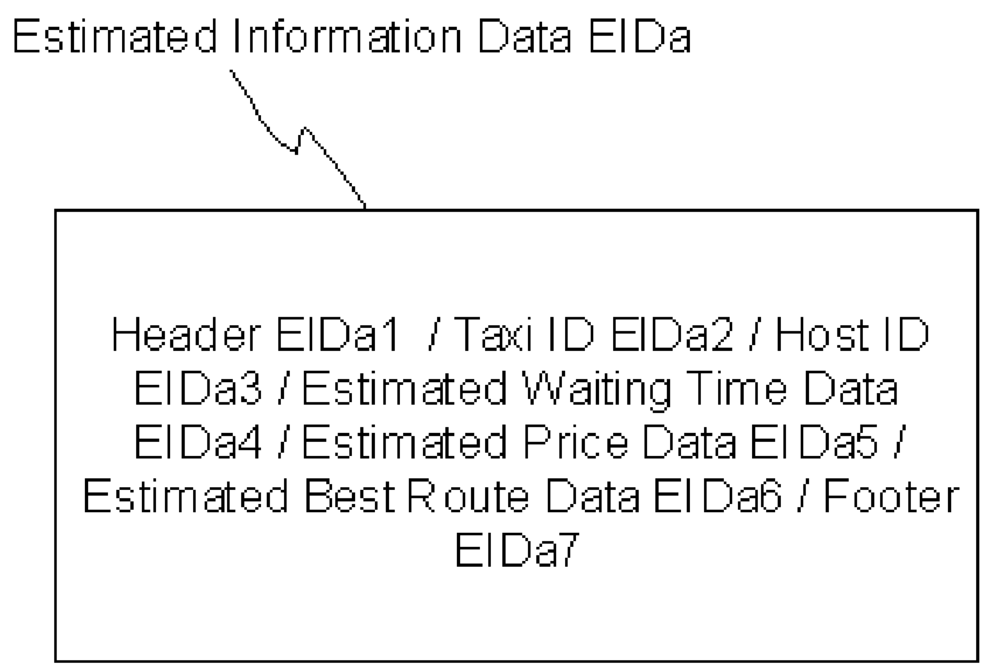

FIG. 259*b* is a simplified illustration of data utilized in the present invention.

Figure 259C:
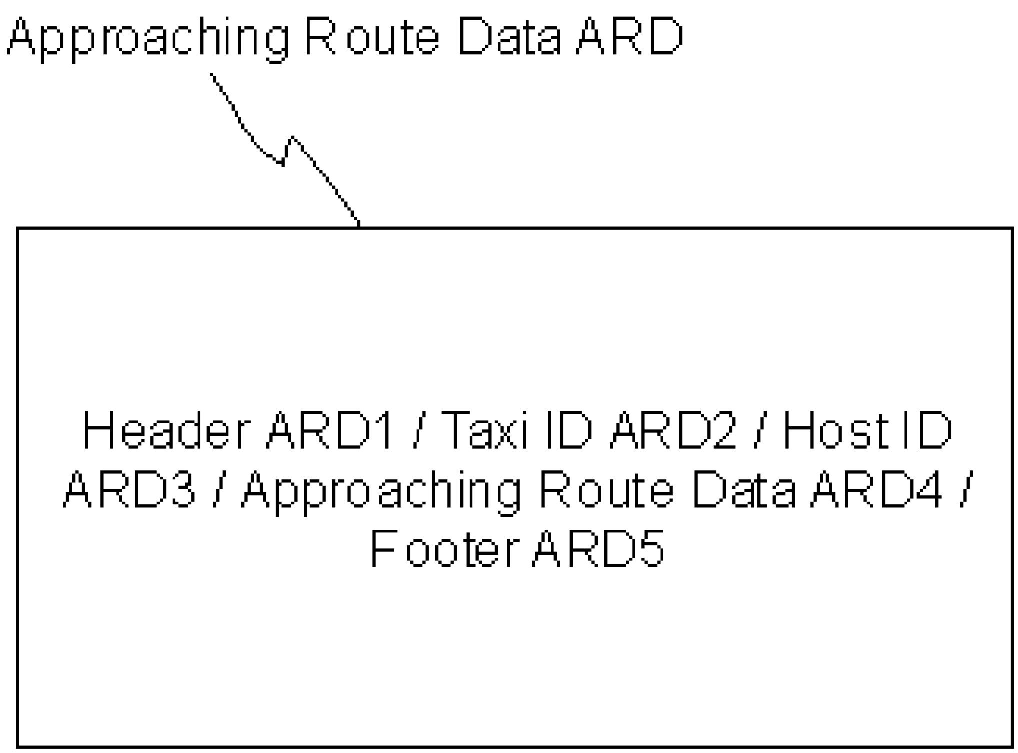

FIG. 259*c* is a simplified illustration of data utilized in the present invention.

Figure 260:
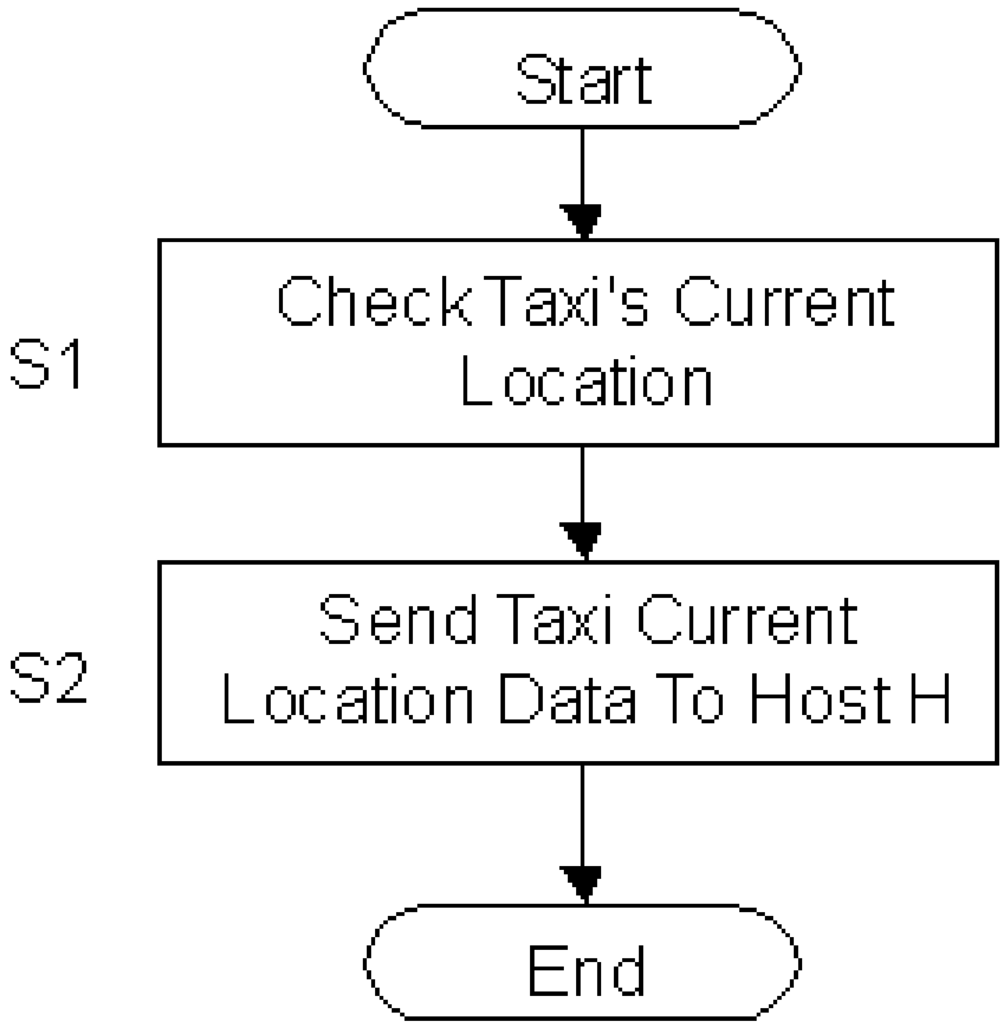

FIG. 260 is a flowchart illustrating an exemplary embodiment of the present invention.

Figure 261:
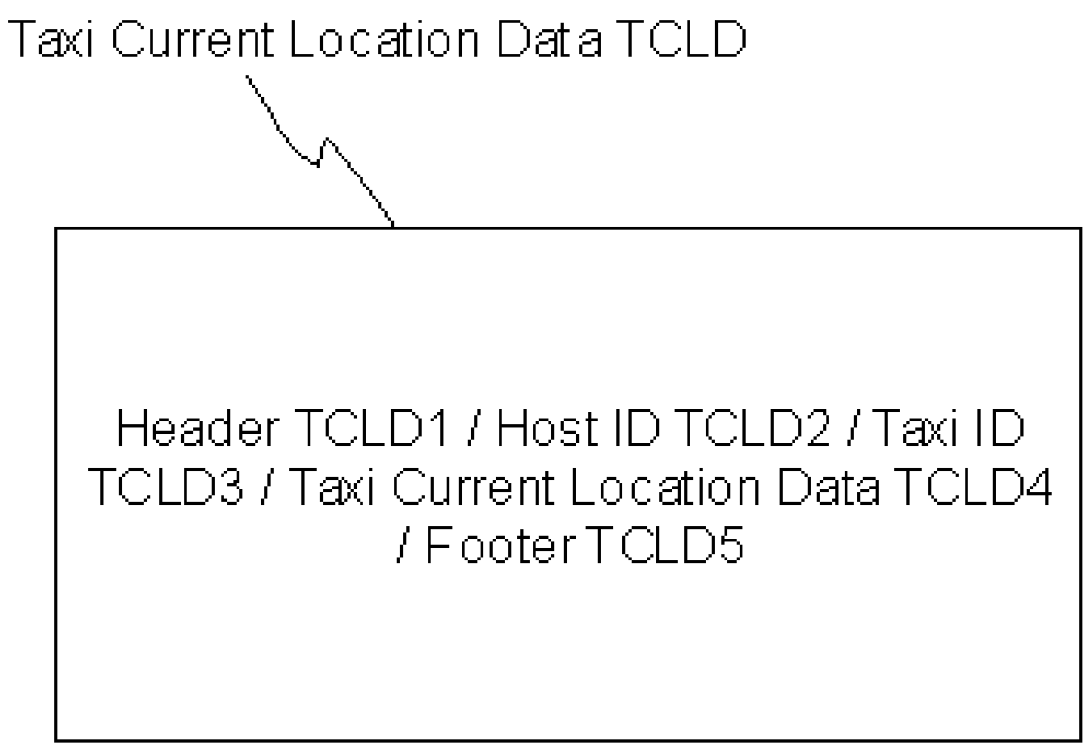

FIG. 261 is a simplified illustration of data utilized in the present invention.

Figure 262:
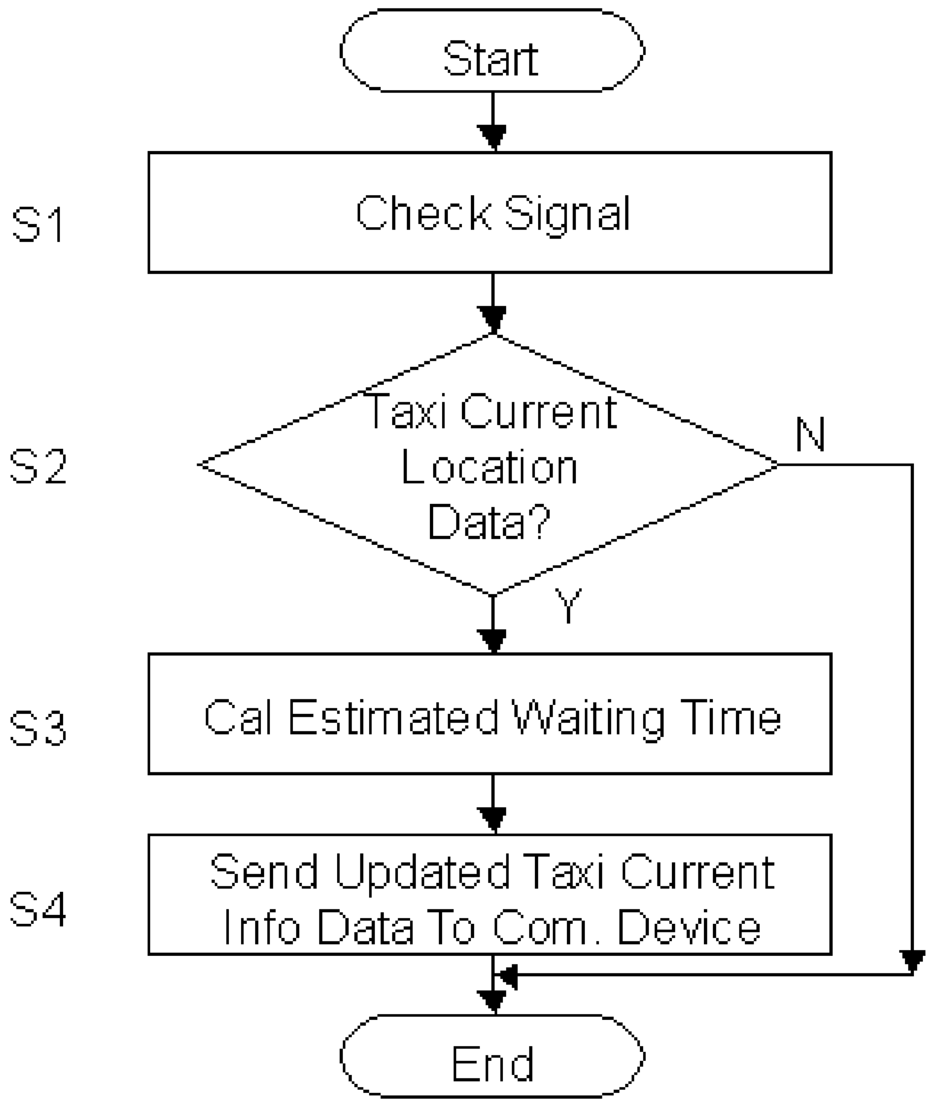

FIG. 262 is a flowchart illustrating an exemplary embodiment of the present invention.

Figure 263:
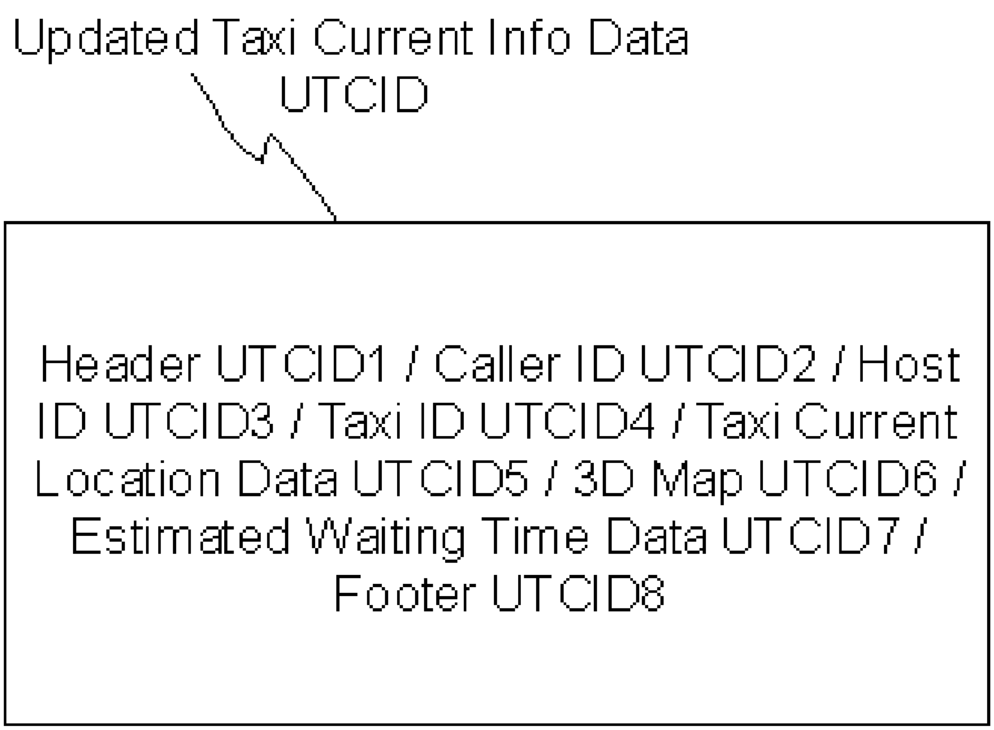

FIG. 263 is a simplified illustration of data utilized in the present invention.

Figure 264:
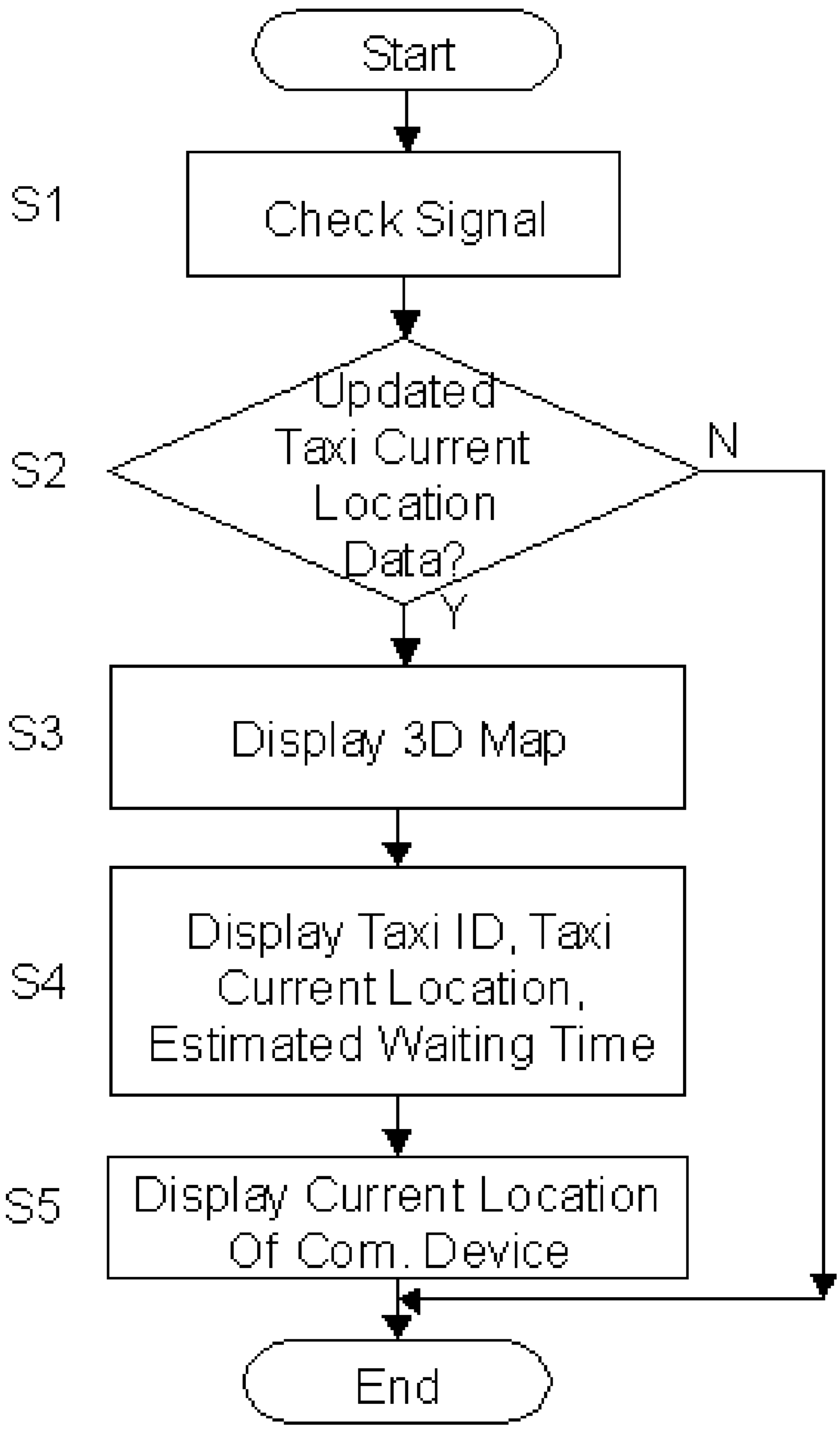

FIG. 264 is a flowchart illustrating an exemplary embodiment of the present invention.

Figure 265:
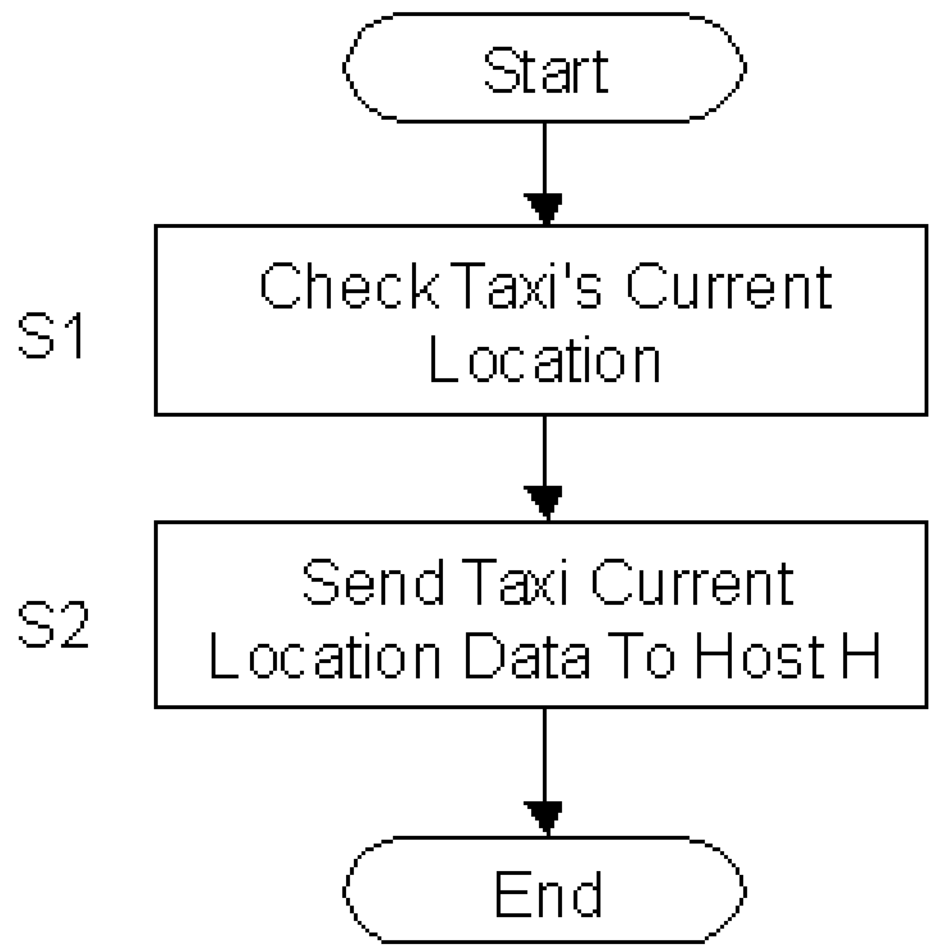

FIG. 265 is a flowchart illustrating an exemplary embodiment of the present invention.

Figure 266:
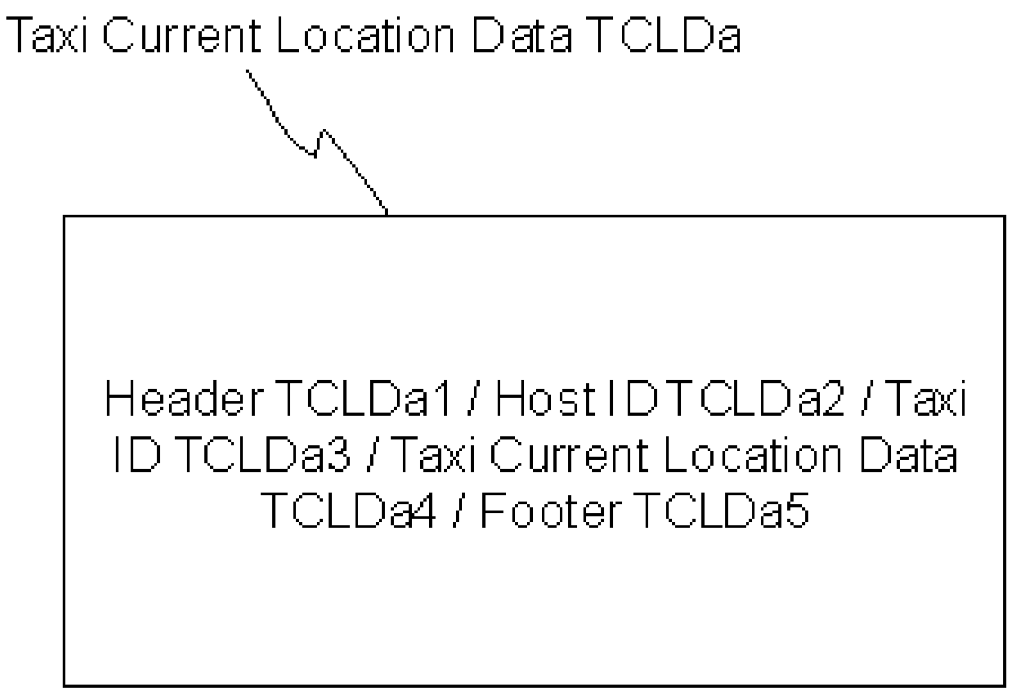

FIG. 266 is a simplified illustration of data utilized in the present invention.

Figure 267:
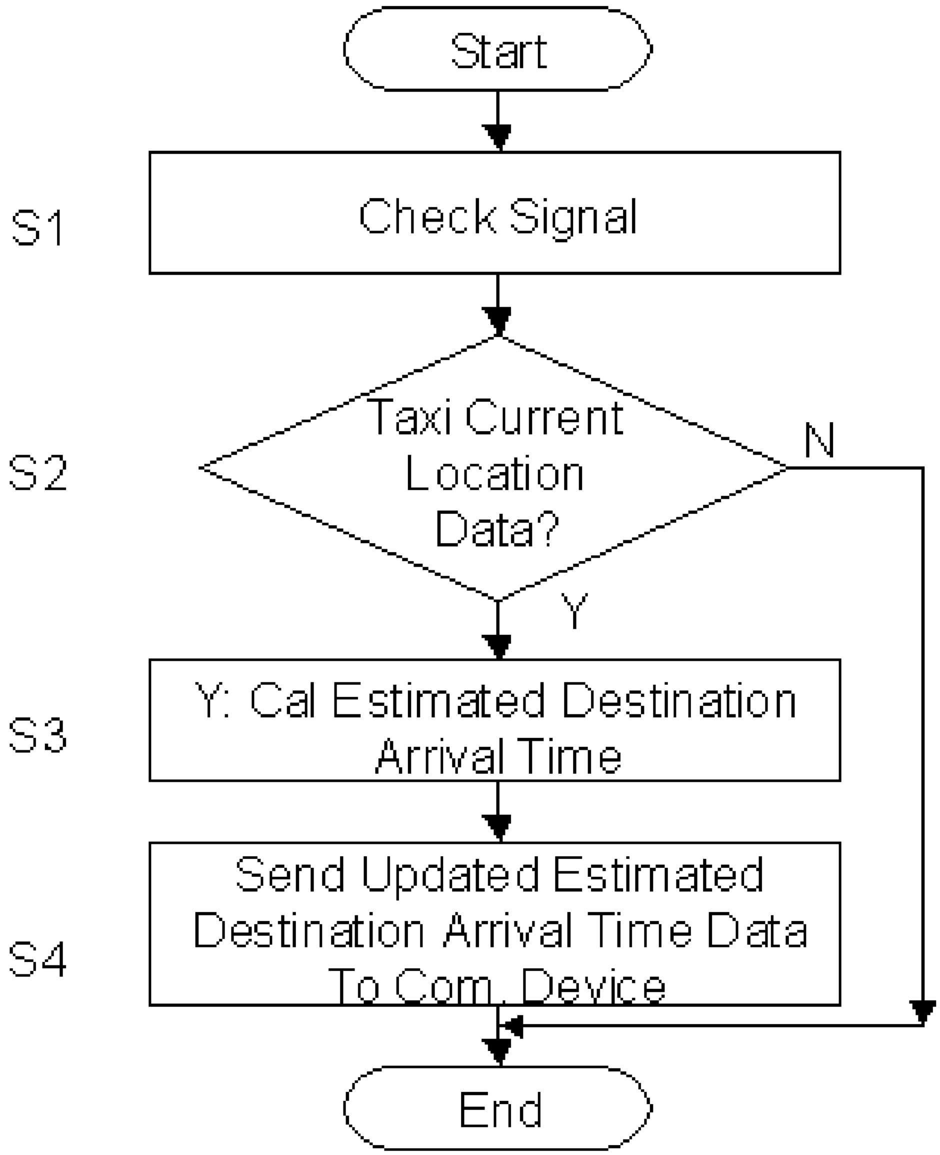

FIG. 267 is a flowchart illustrating an exemplary embodiment of the present invention.

FIG. 268 is a simplified illustration of data utilized in the present invention.

Figure 269:
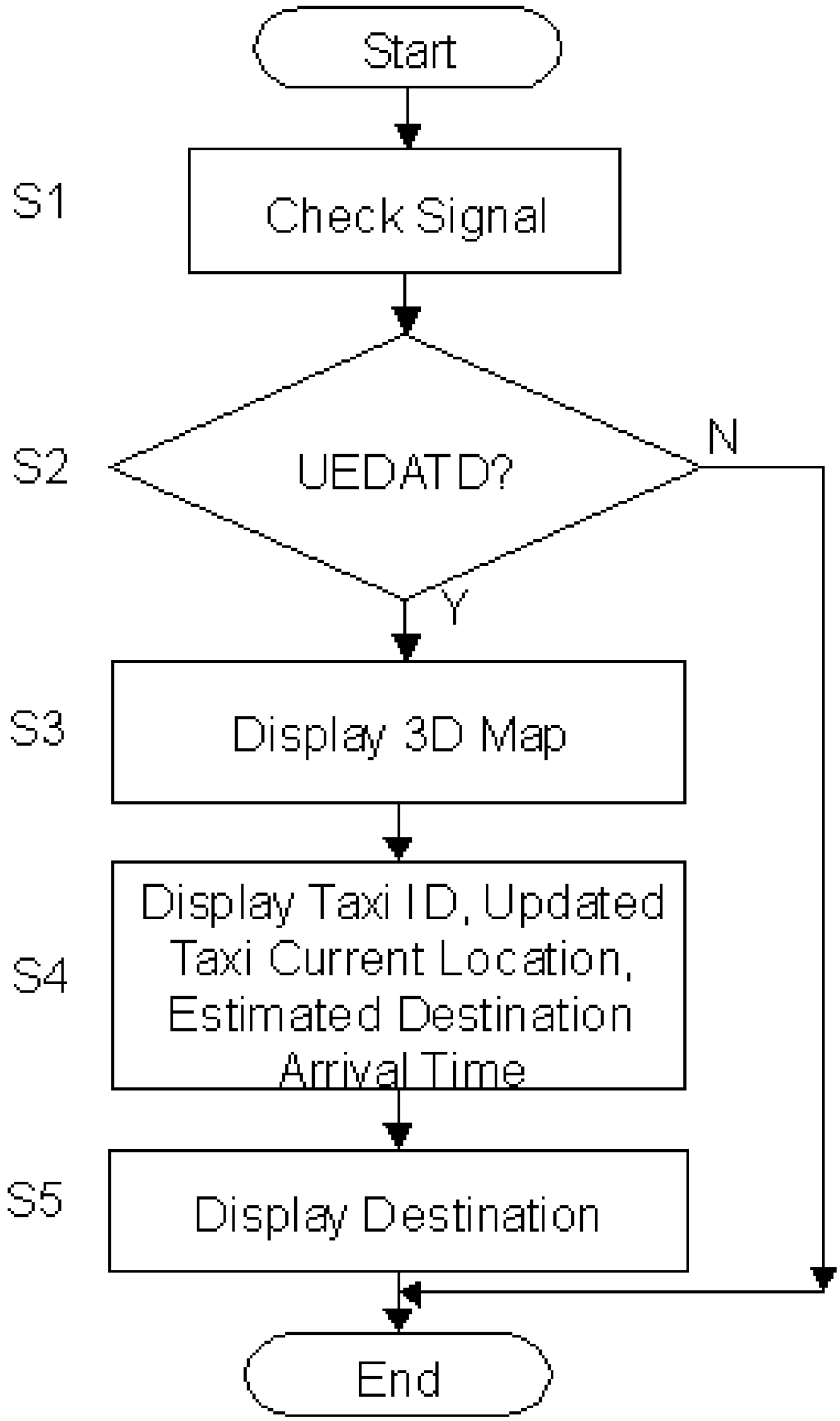

FIG. 269 is a flowchart illustrating an exemplary embodiment of the present invention.

Figure 270:
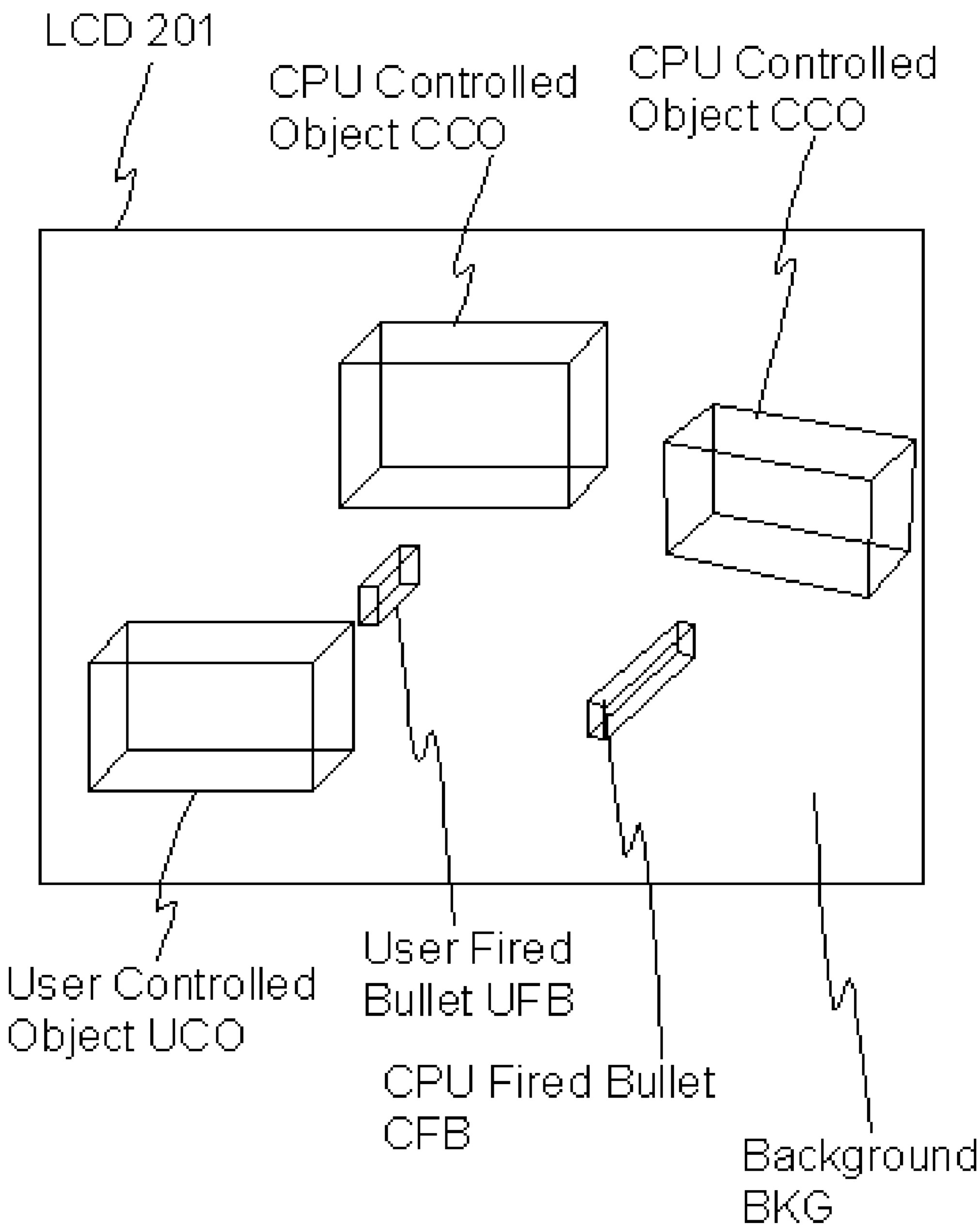

FIG. 270 is a simplified illustration of contents and items shown on display.

FIG. 271 is a simplified illustration of data utilized in the present invention.

Figure 272:
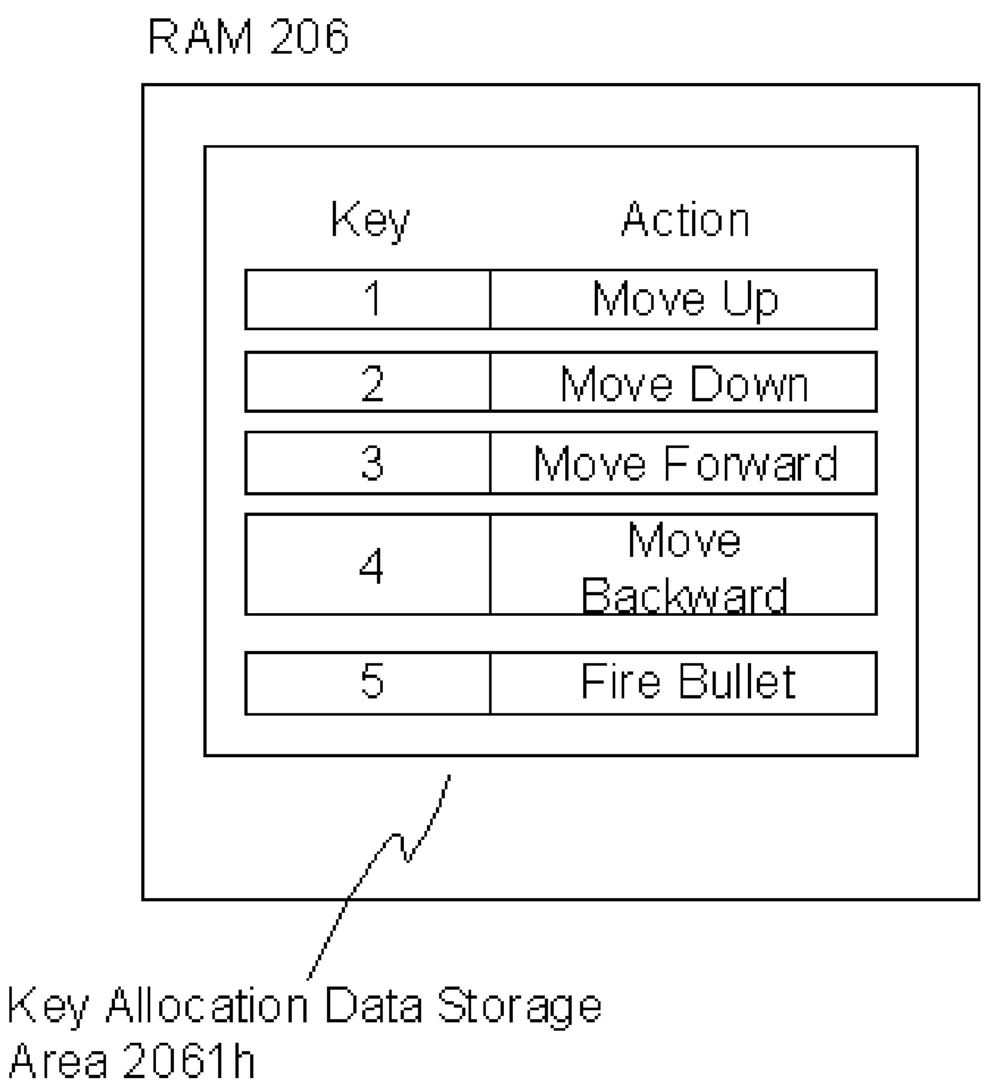

FIG. 272 is a block diagram illustrating an exemplary embodiment of the present invention.

Figure 273:
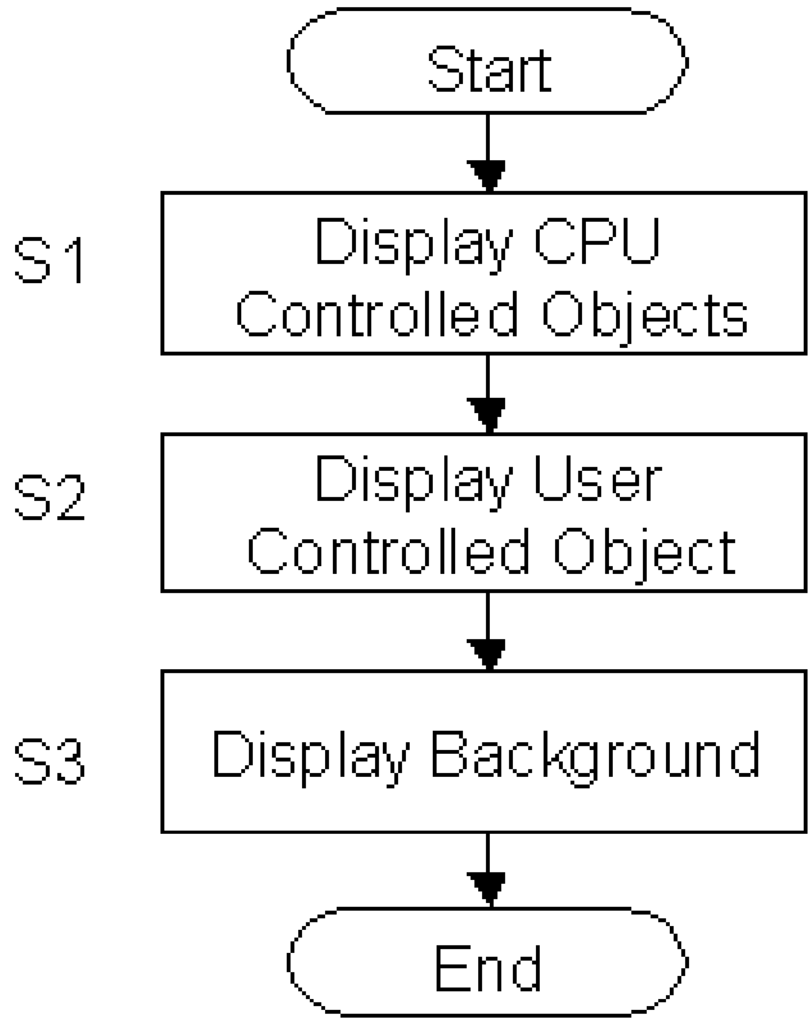

FIG. 273 is a flowchart illustrating an exemplary embodiment of the present invention.

Figure 274:
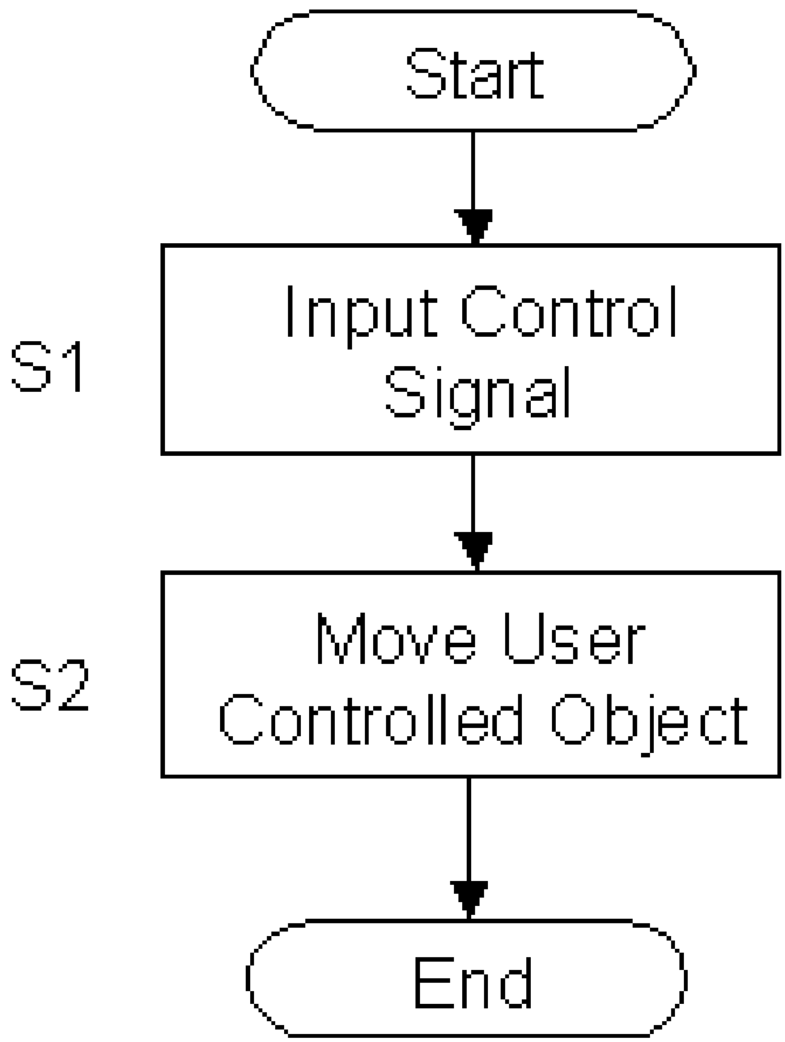

FIG. 274 is a flowchart illustrating an exemplary embodiment of the present invention.

Figure 275:
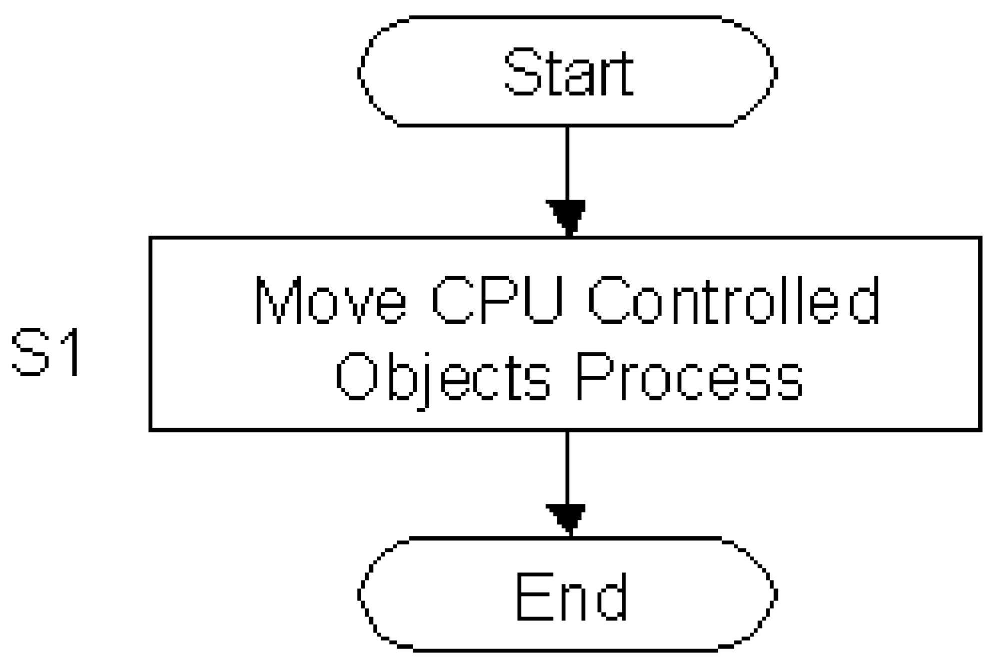

FIG. 275 is a flowchart illustrating an exemplary embodiment of the present invention.

Figure 276:
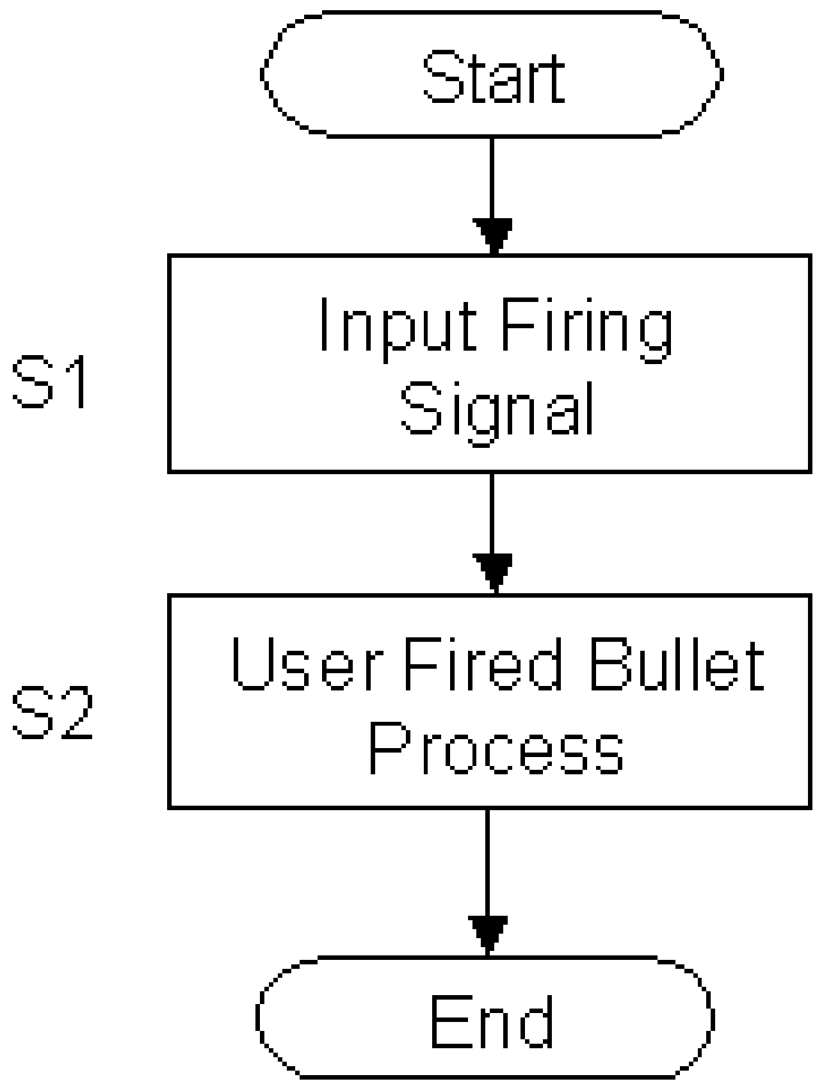

FIG. 276 is a flowchart illustrating an exemplary embodiment of the present invention.

Figure 277:
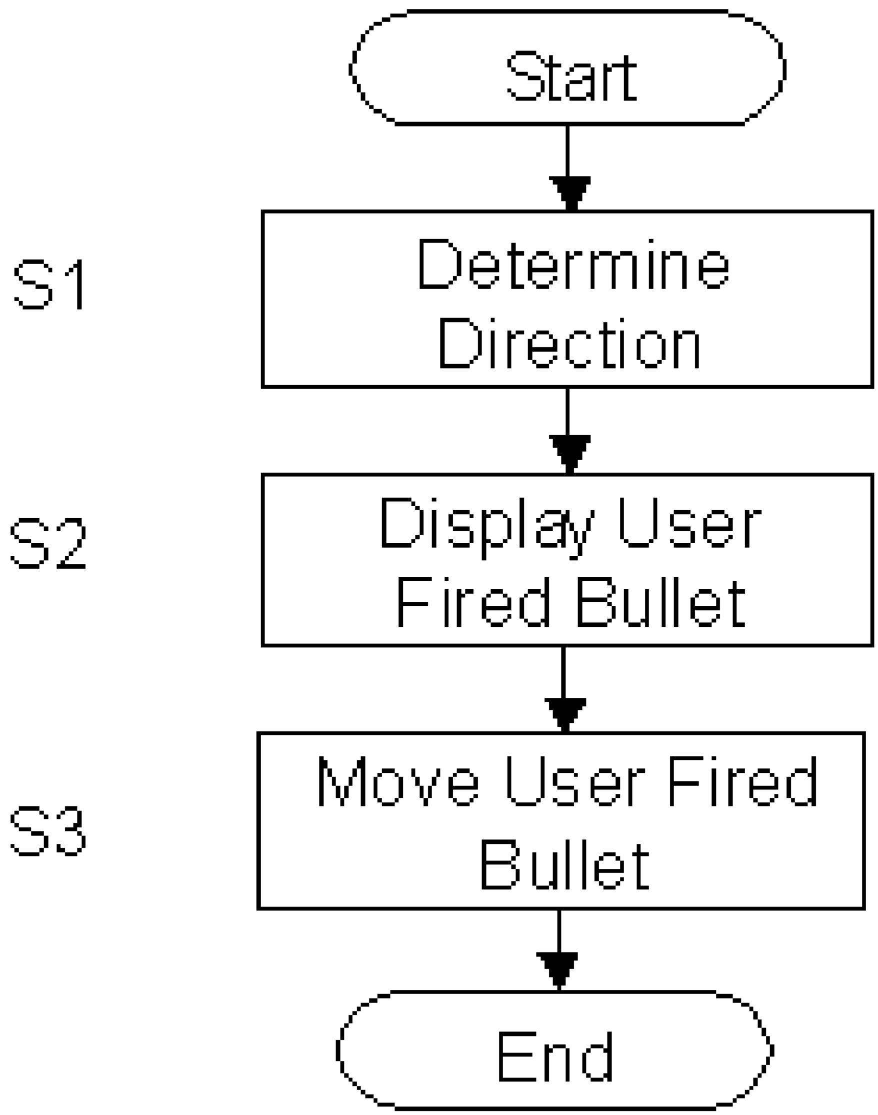

FIG. 277 is a flowchart illustrating an exemplary embodiment of the present invention.

Figure 278:
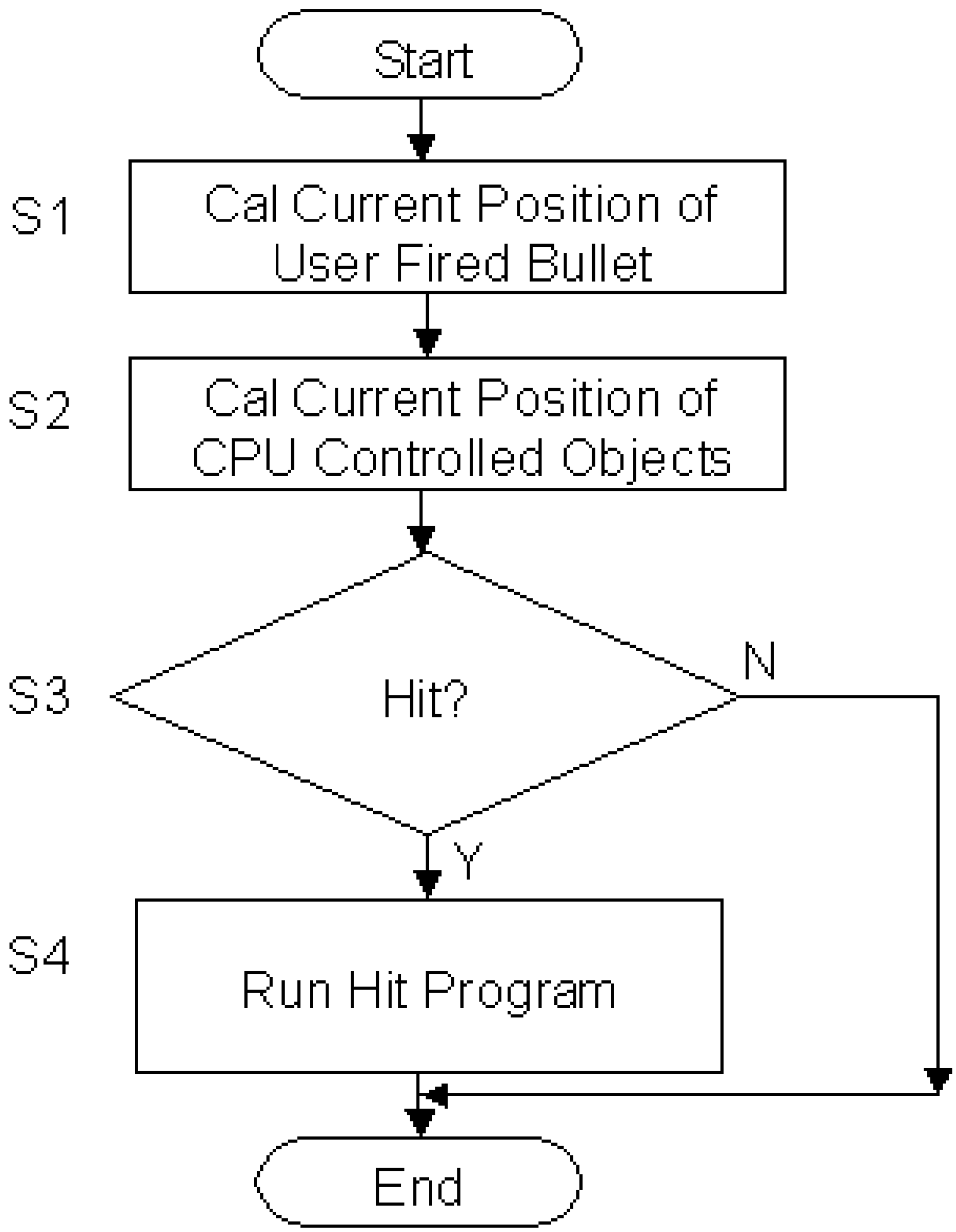

FIG. 278 is a flowchart illustrating an exemplary embodiment of the present invention.

Figure 279:
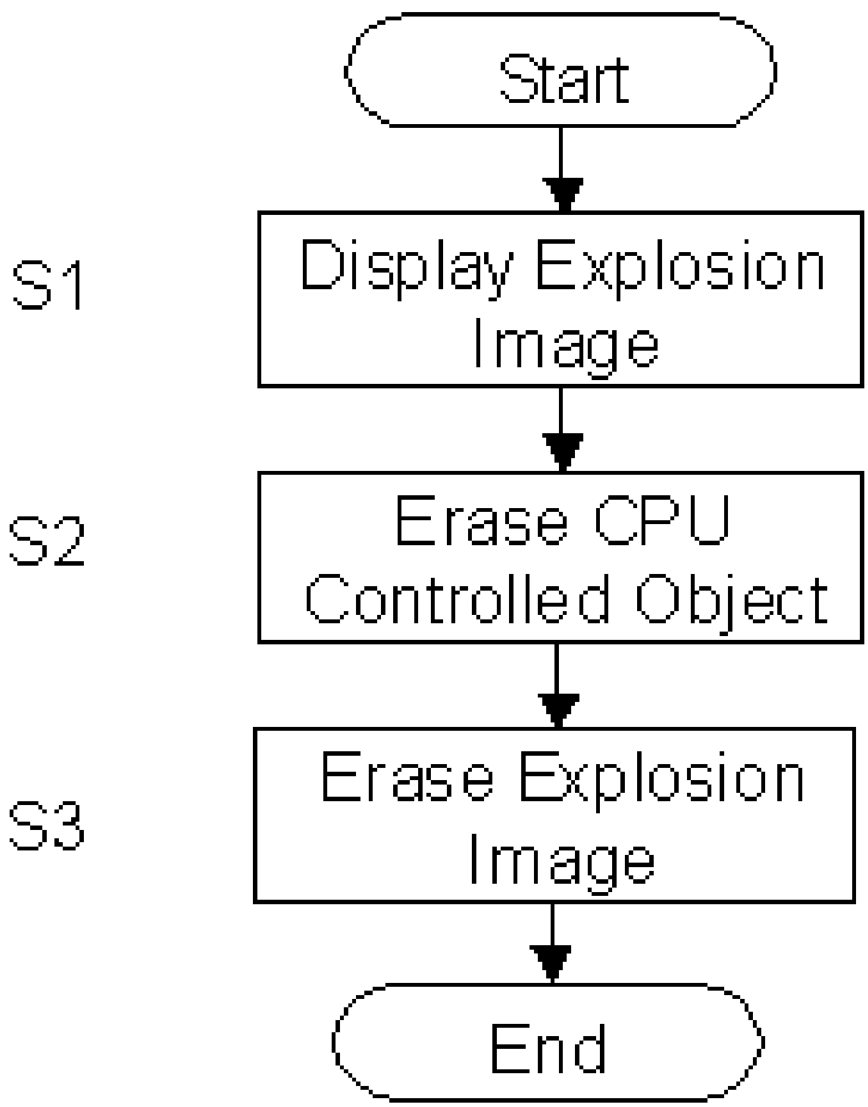

FIG. 279 is a flowchart illustrating an exemplary embodiment of the present invention.

Figure 280:
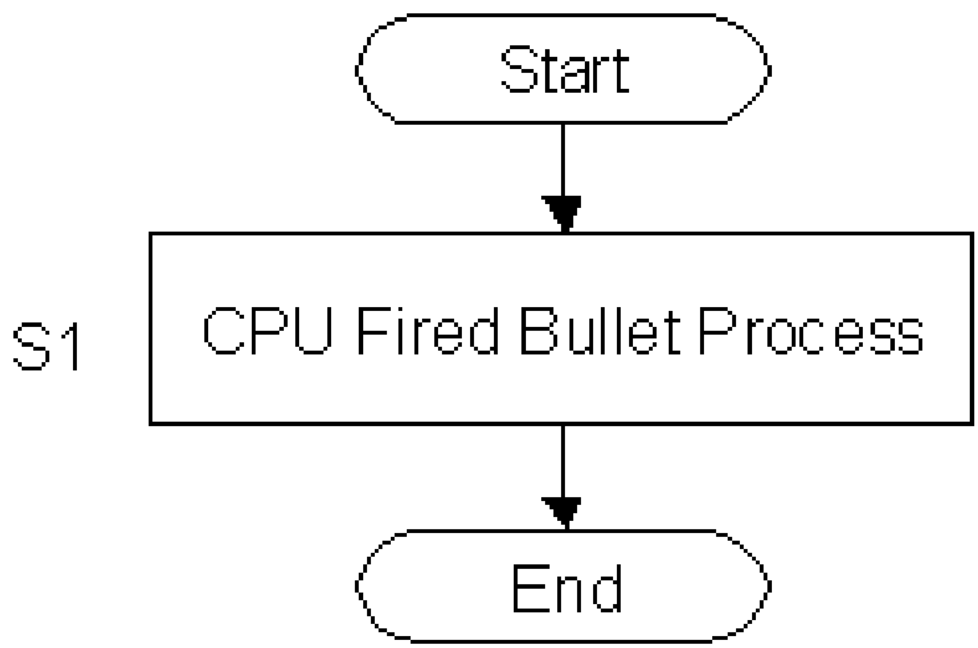

FIG. 280 is a flowchart illustrating an exemplary embodiment of the present invention.

Figure 281:
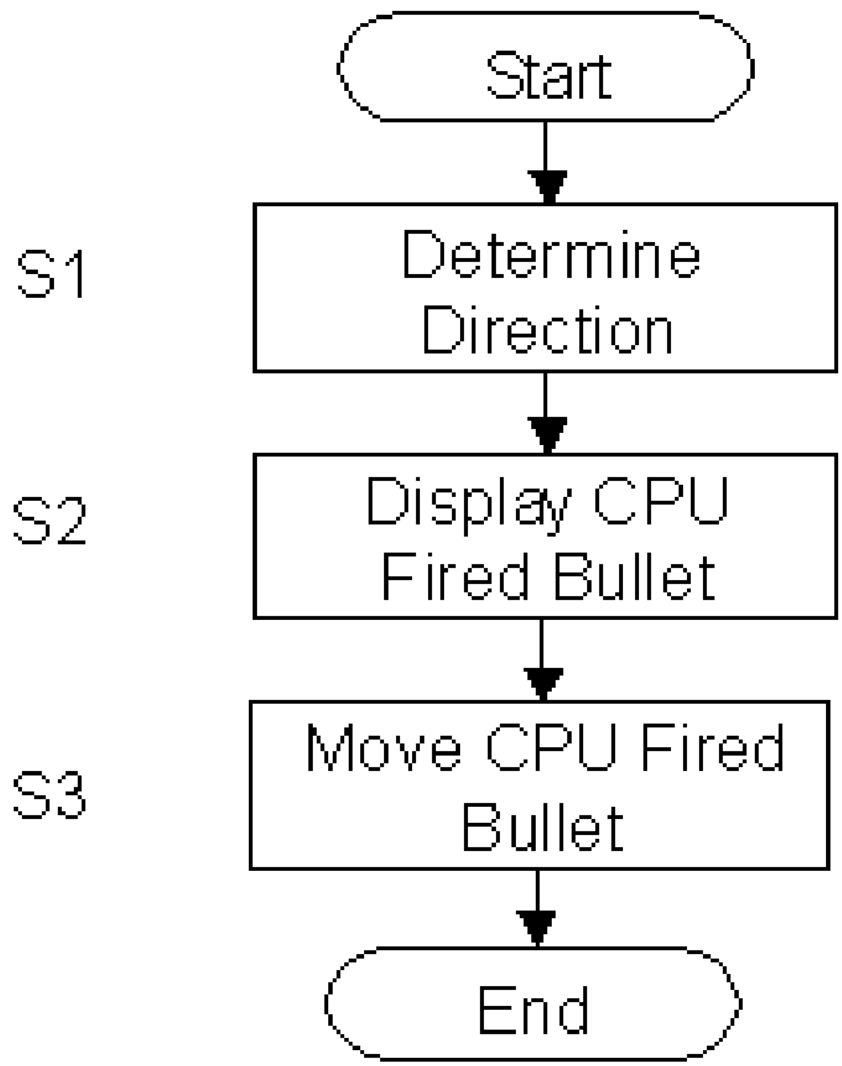

FIG. 281 is a flowchart illustrating an exemplary embodiment of the present invention.

Figure 282:
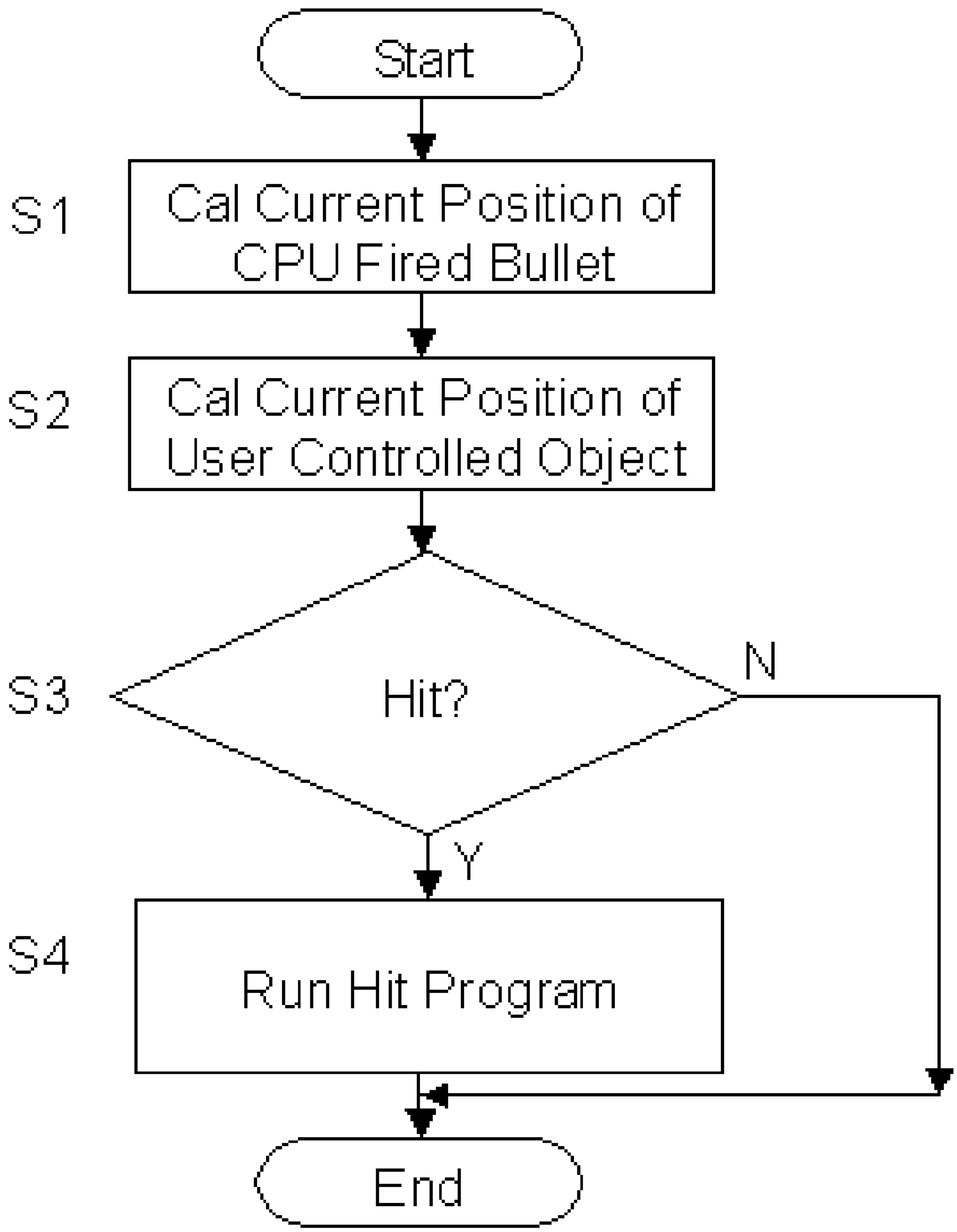

FIG. 282 is a flowchart illustrating an exemplary embodiment of the present invention.

Figure 283:
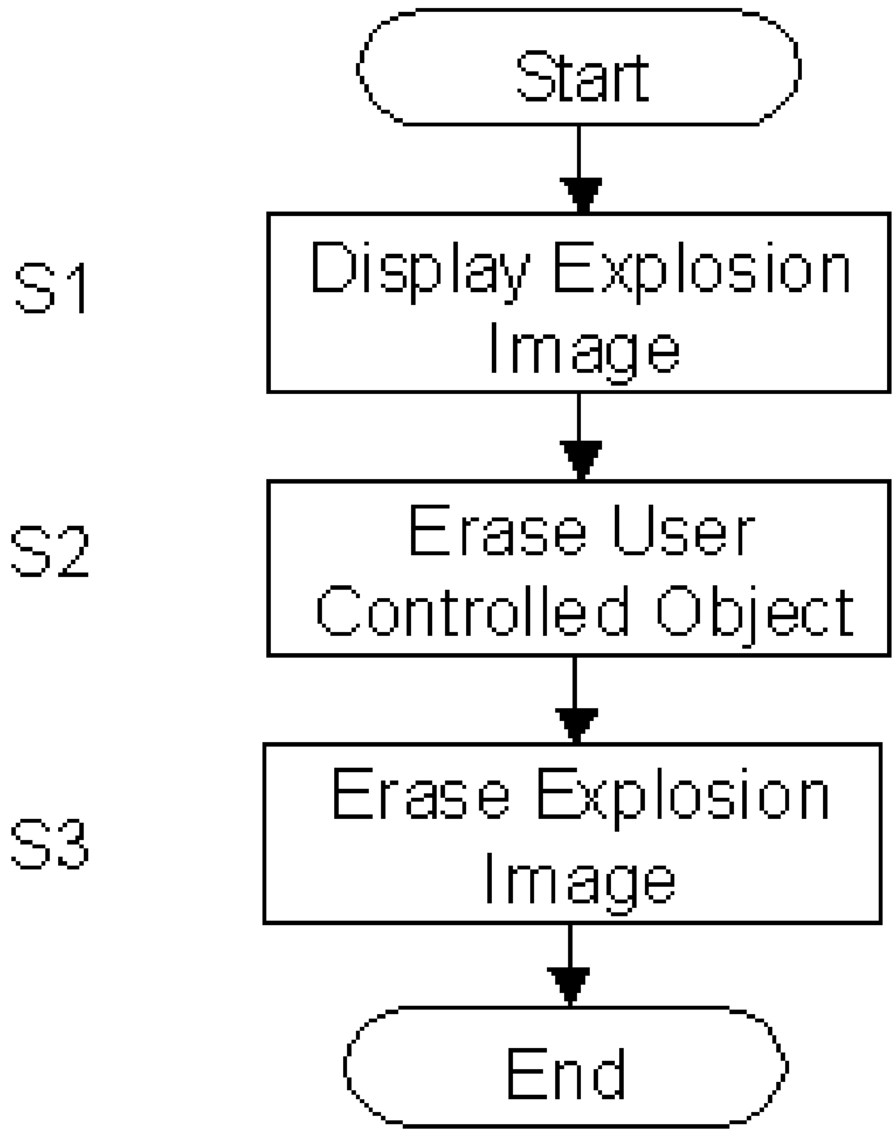

FIG. 283 is a flowchart illustrating an exemplary embodiment of the present invention.

Figure 284:
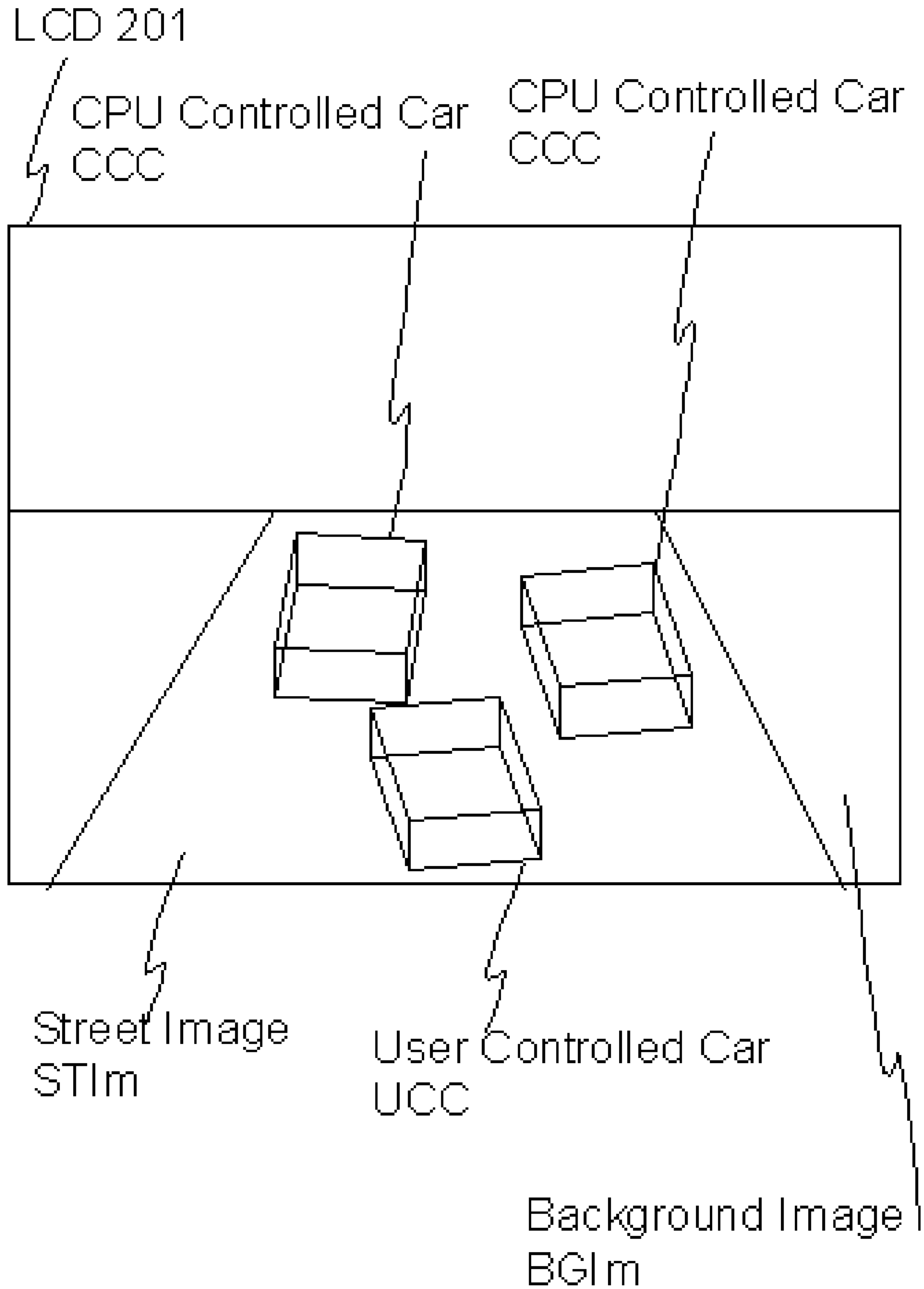

FIG. 284 is a simplified illustration illustrating an exemplary embodiment of the present invention.

FIG. 285 is a simplified illustration of data utilized in the present invention.

Figure 286:
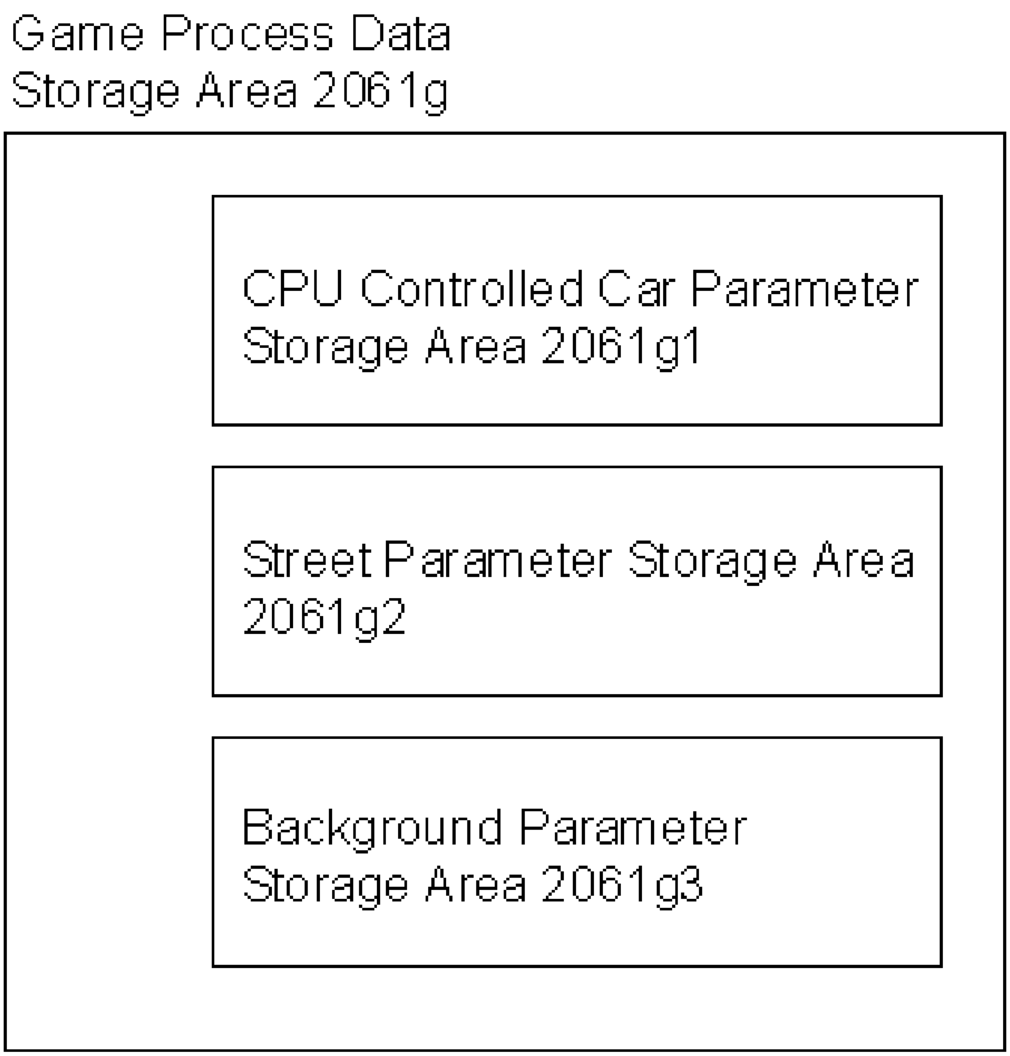

FIG. 286 is a block diagram illustrating an exemplary embodiment of the present invention.

Figure 287:
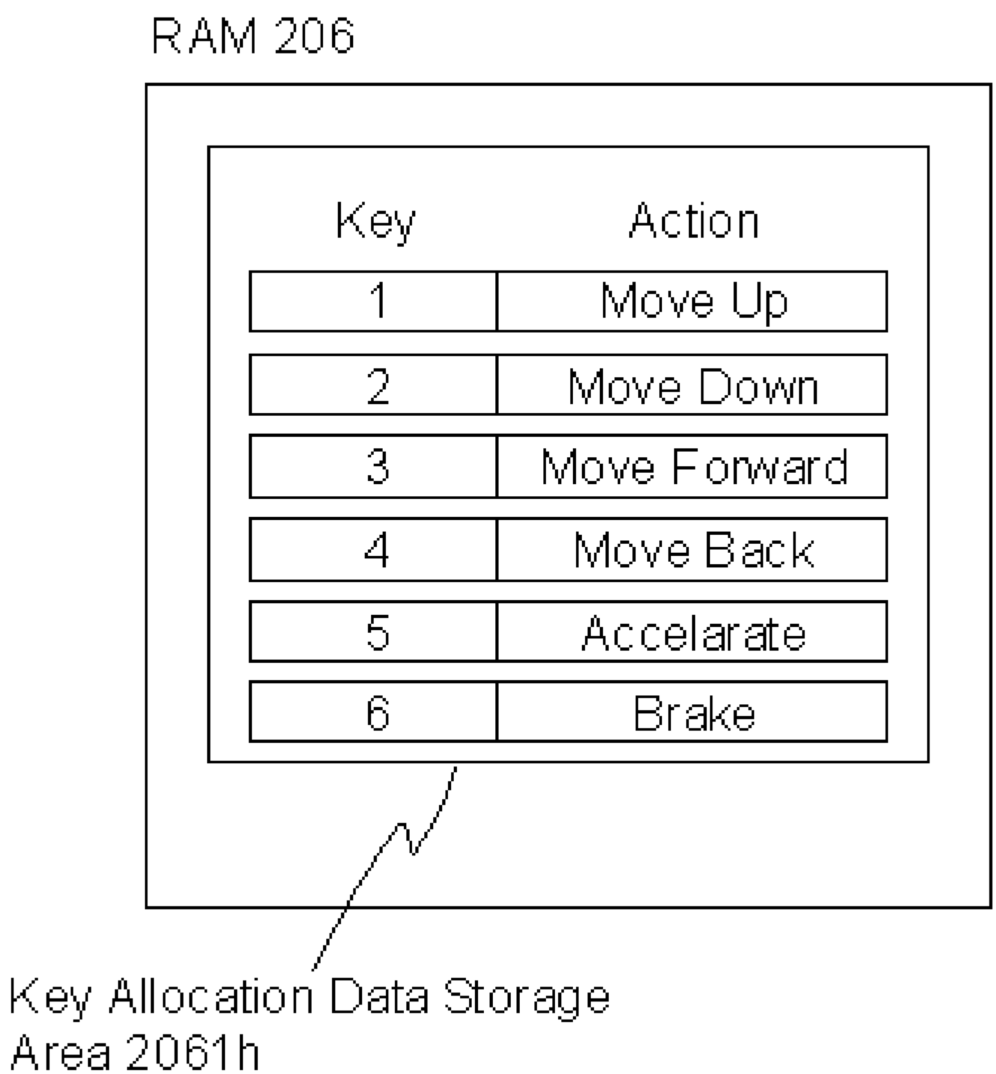

FIG. 287 is a block diagram illustrating an exemplary embodiment of the present invention.

Figure 288:
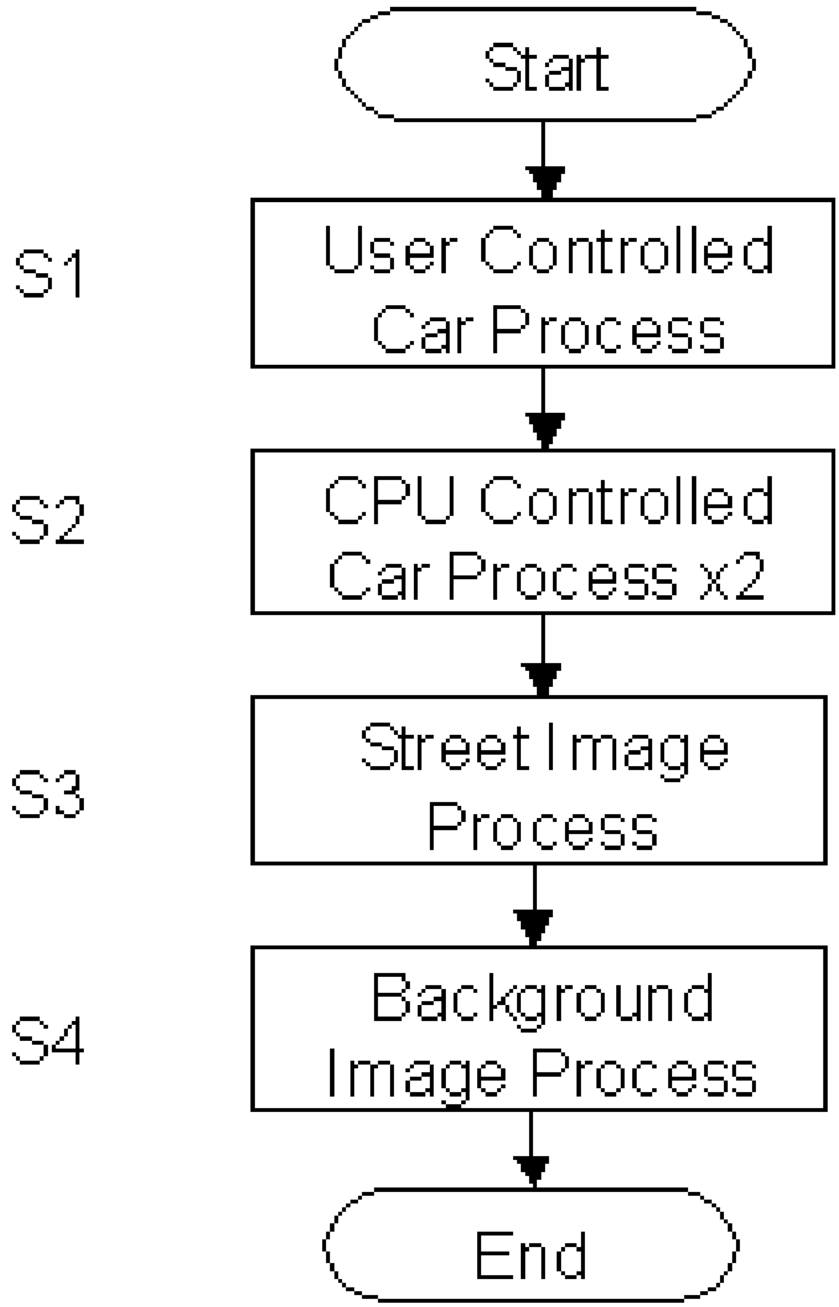

FIG. 288 is a flowchart illustrating an exemplary embodiment of the present invention.

Figure 289:
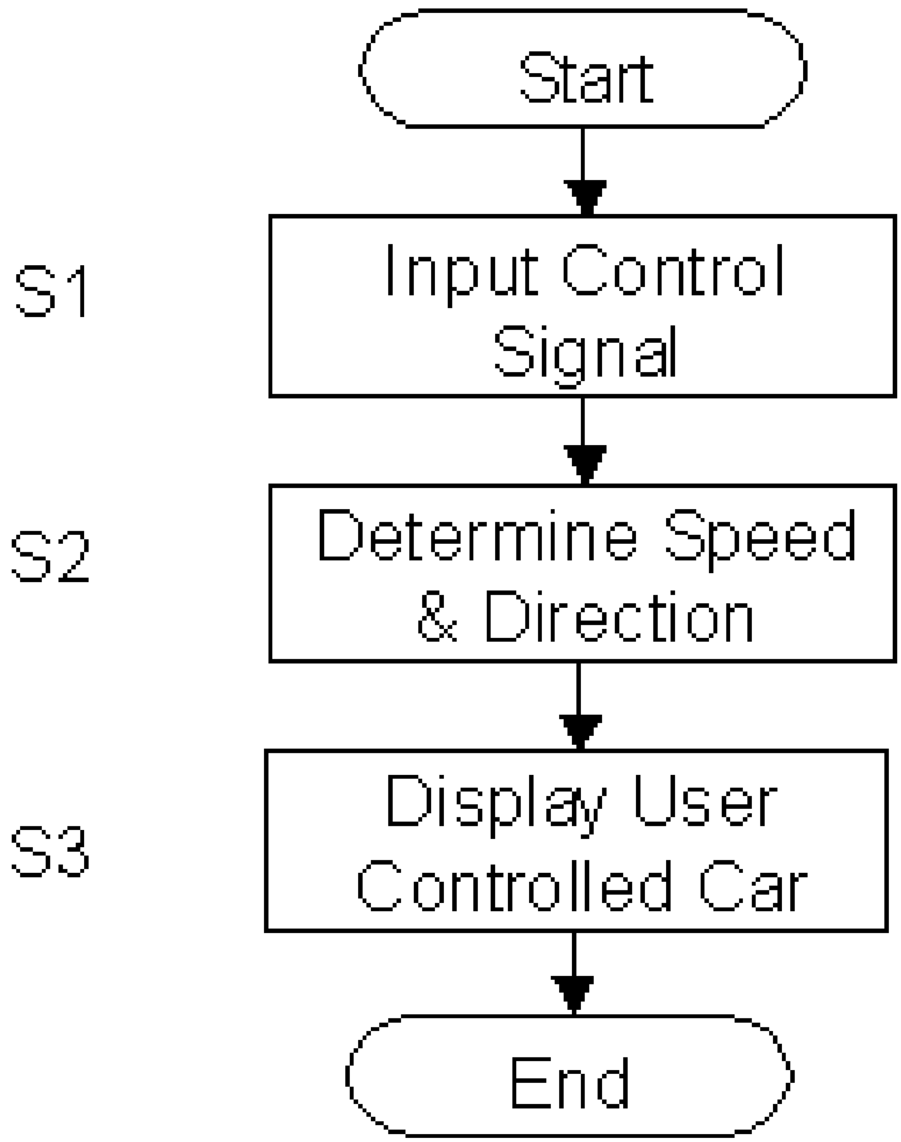

FIG. 289 is a flowchart illustrating an exemplary embodiment of the present invention.

Figure 290:
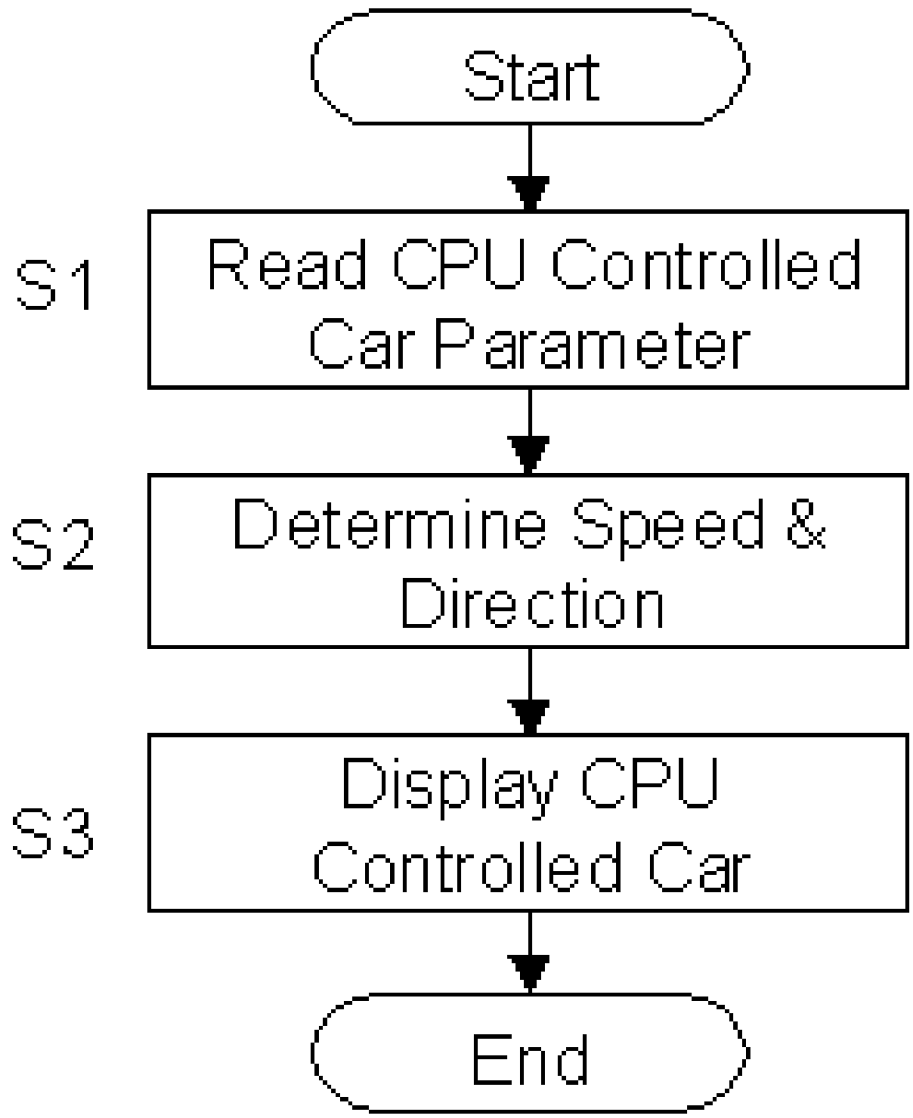

FIG. 290 is a flowchart illustrating an exemplary embodiment of the present invention.

Figure 291:
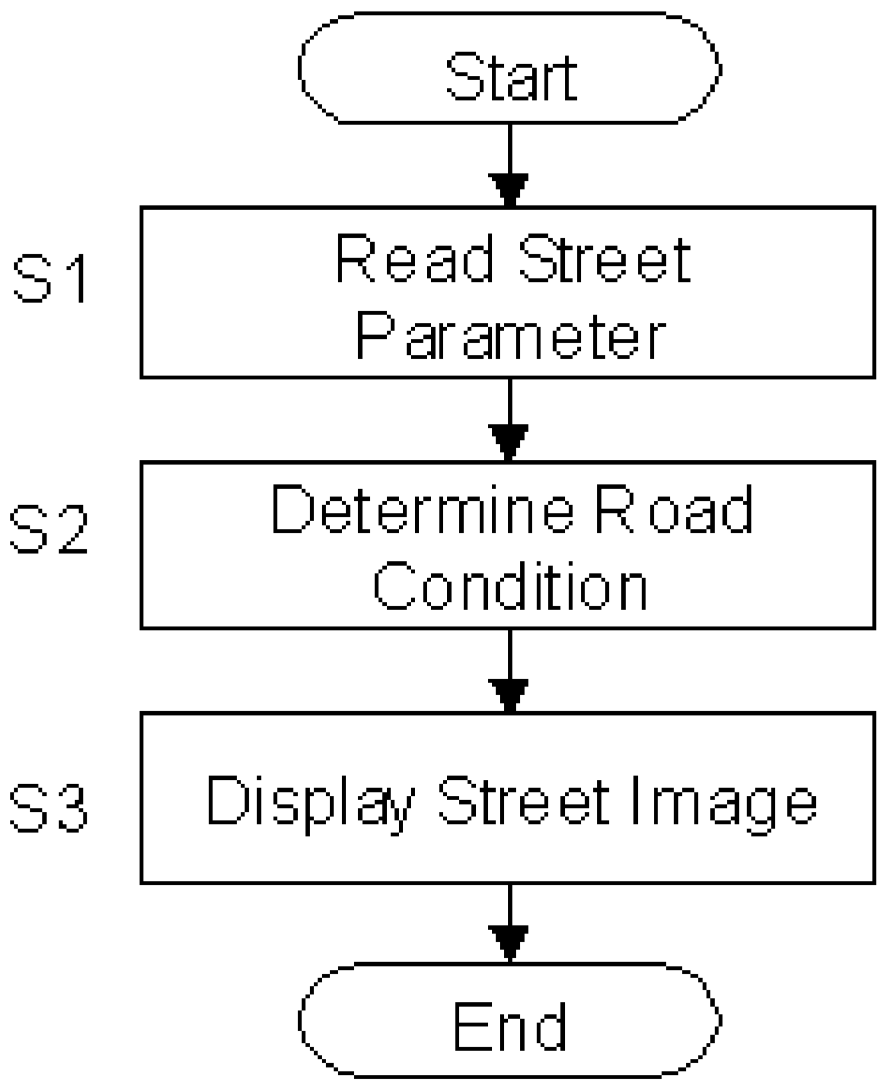

FIG. 291 is a flowchart illustrating an exemplary embodiment of the present invention.

Figure 292:
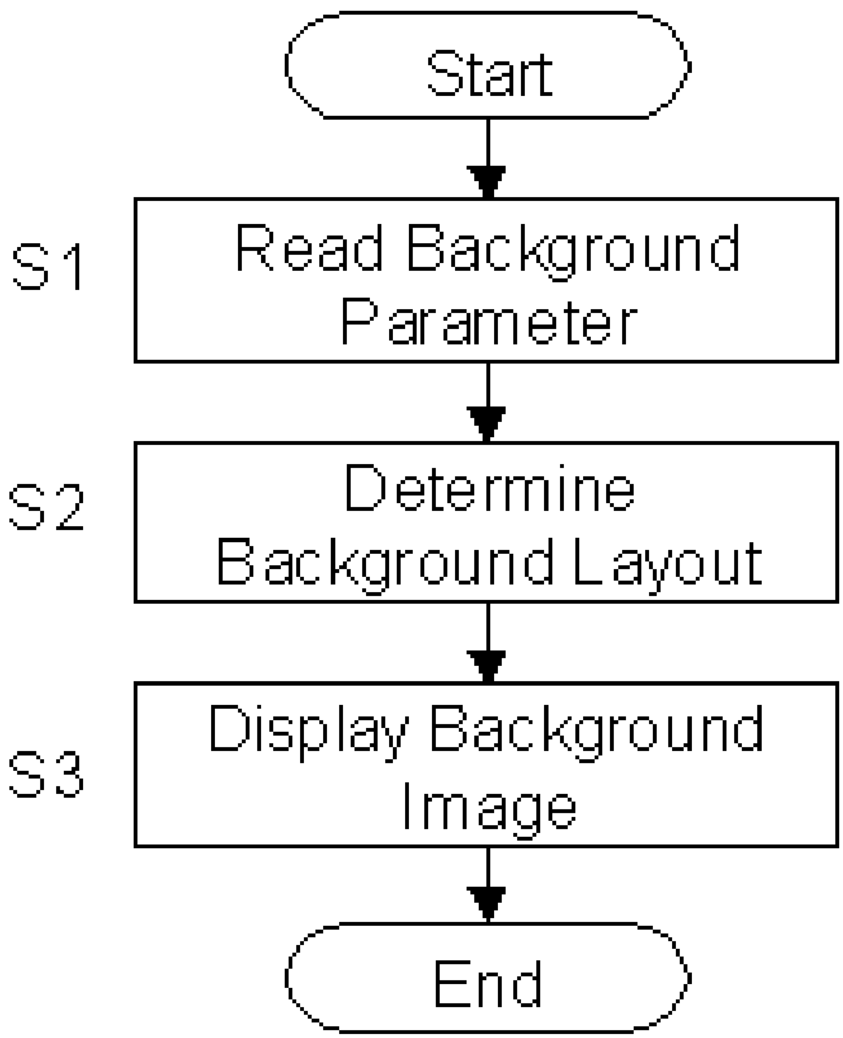

FIG. 292 is a flowchart illustrating an exemplary embodiment of the present invention.

Figure 293:
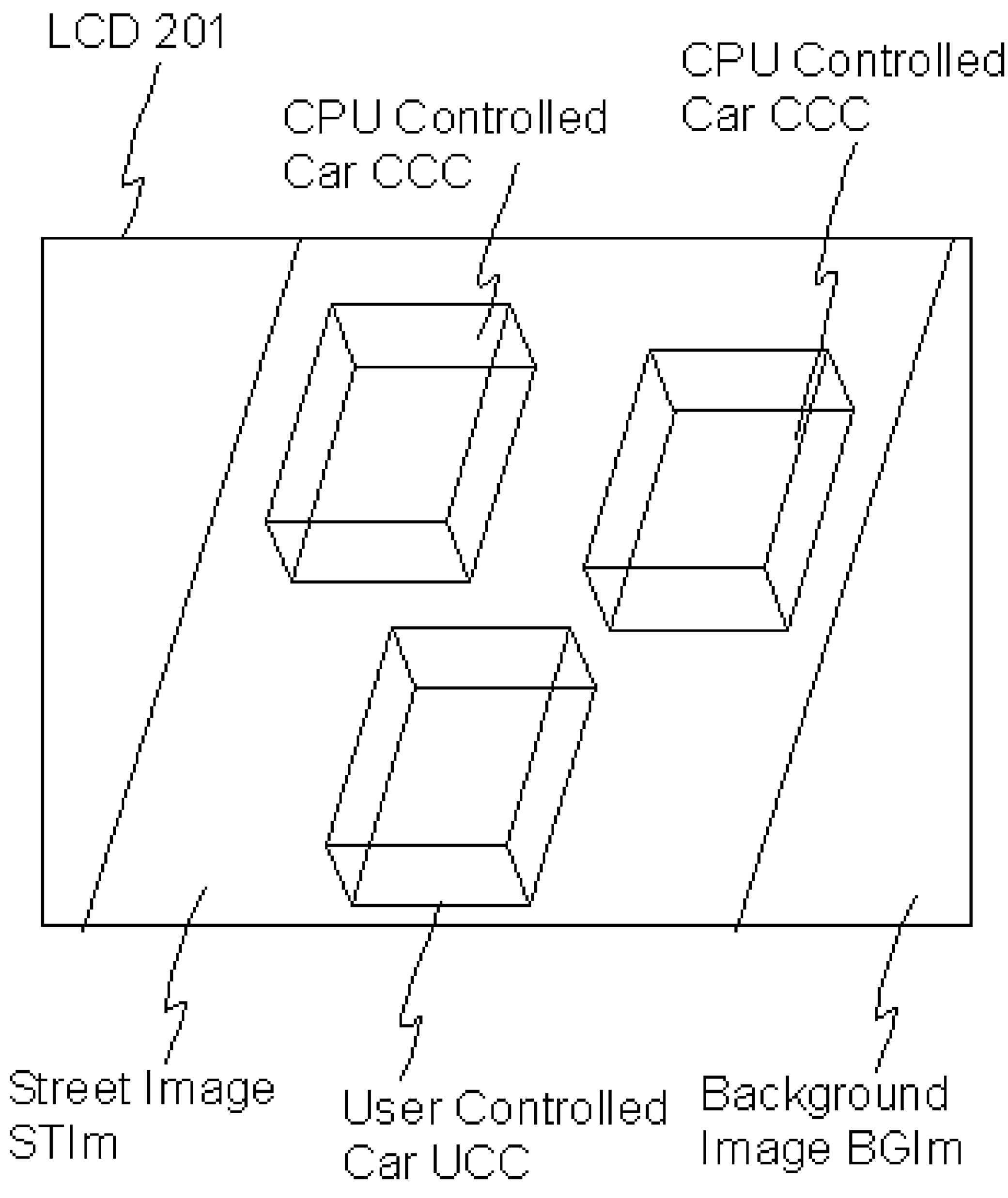

FIG. 293 is a simplified illustration illustrating an exemplary embodiment of the present invention.

Figure 294:
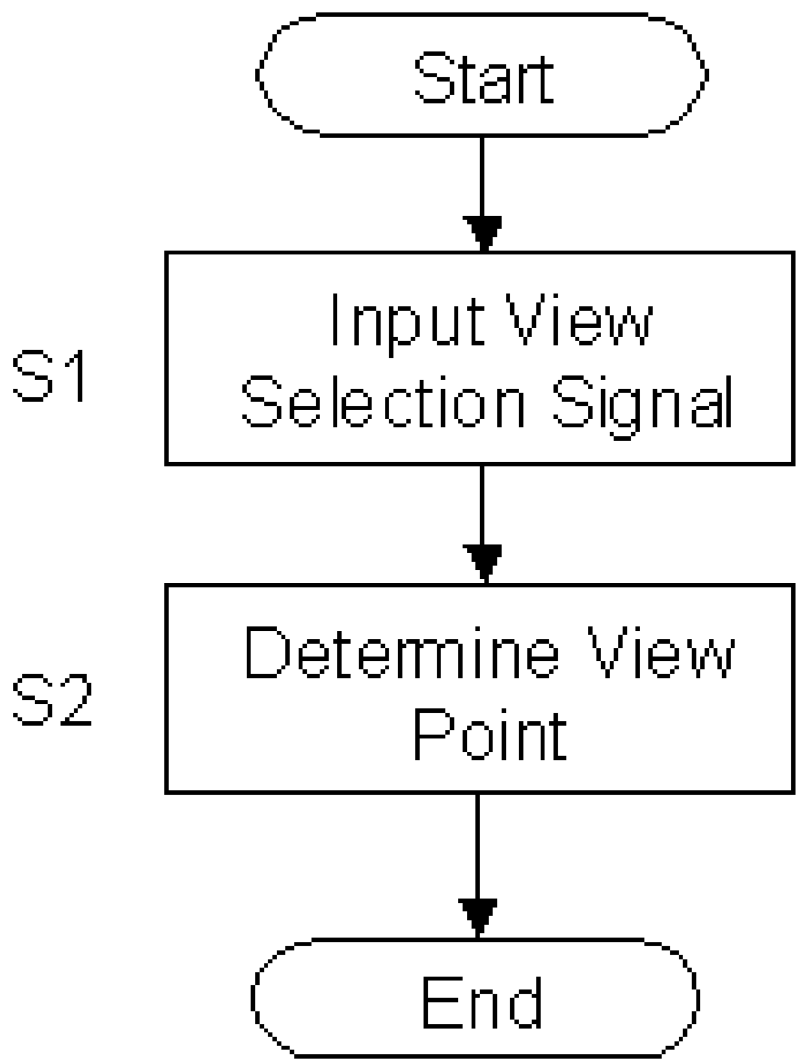

FIG. 294 is a flowchart illustrating an exemplary embodiment of the present invention.

Figure 295:
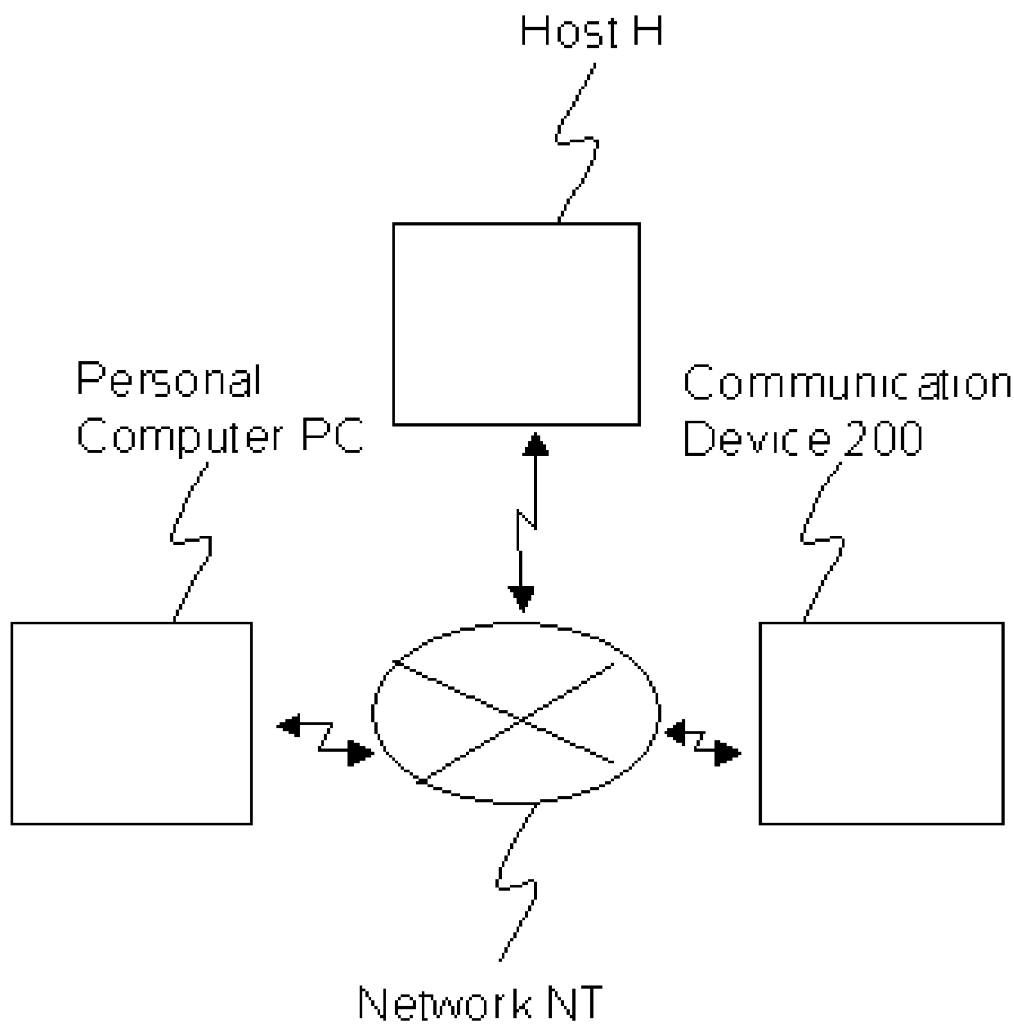

FIG. 295 is a simplified illustration illustrating an exemplary embodiment of the present invention.

Figure 296:
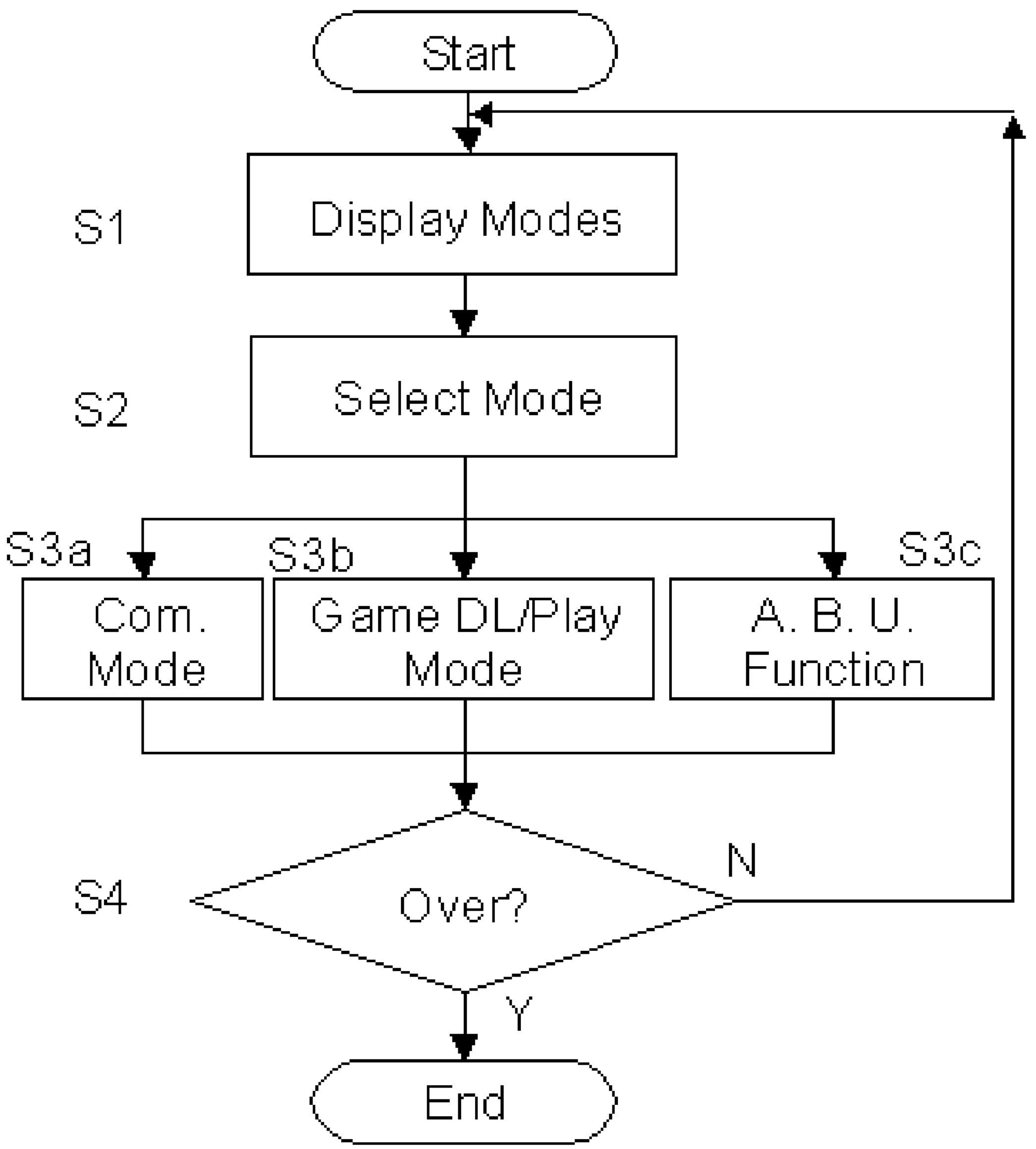

FIG. 296 is a flowchart illustrating an exemplary embodiment of the present invention.

Figure 297:
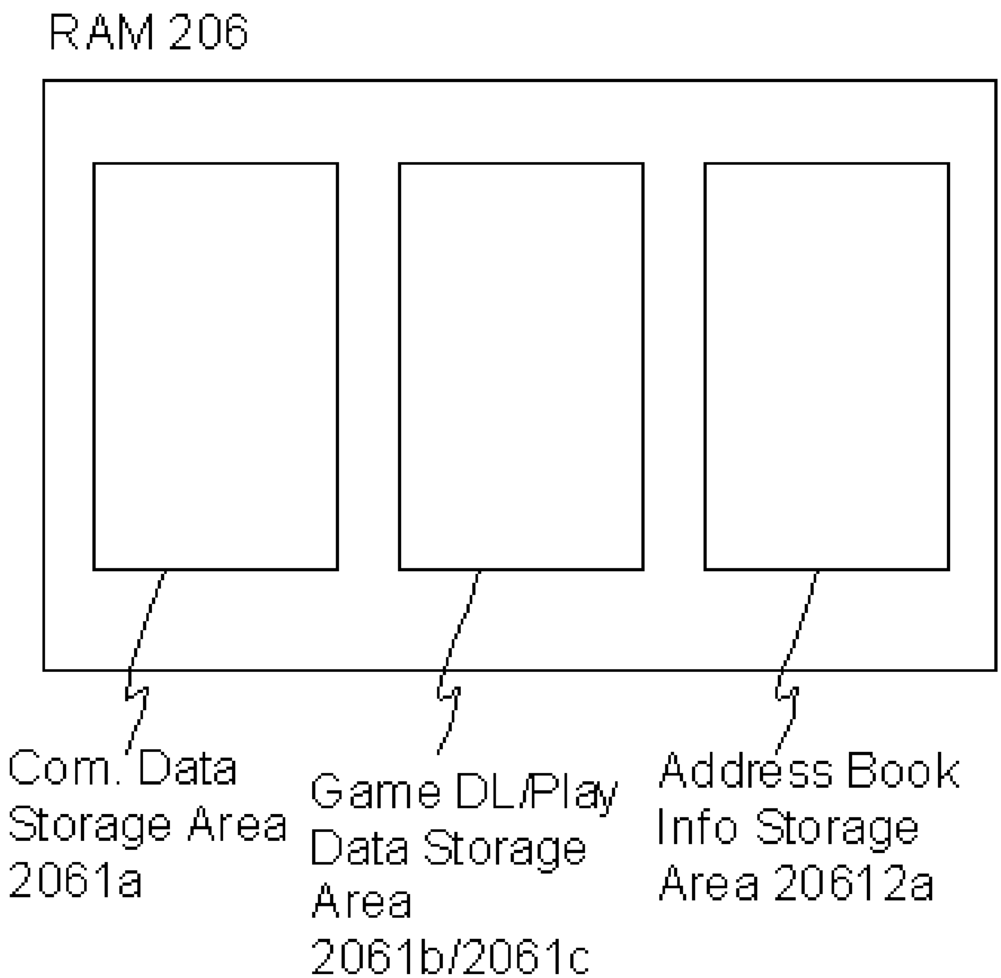

FIG. 297 is a block diagram illustrating an exemplary embodiment of the present invention.

Figure 298:
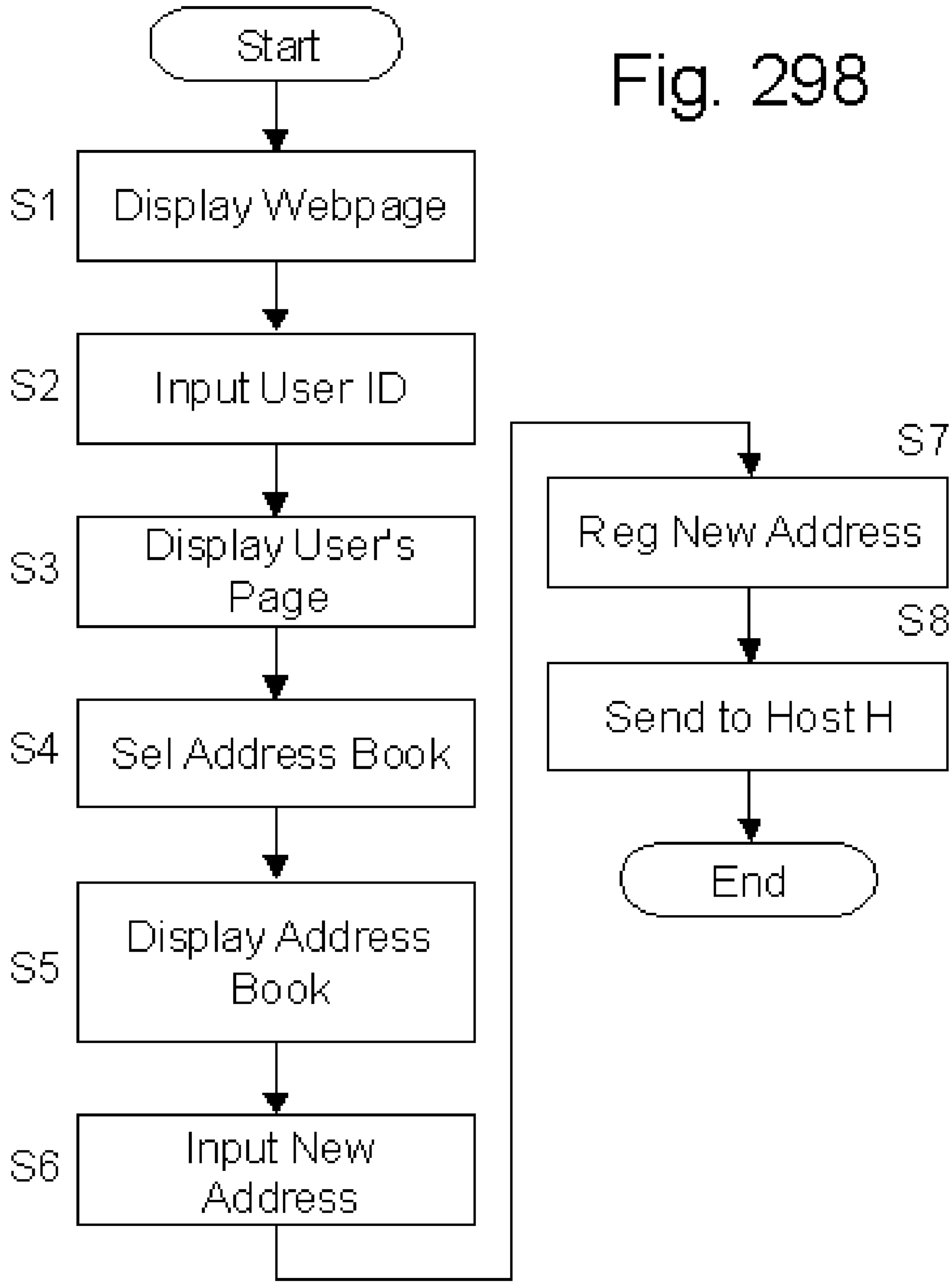

FIG. 298 is a flowchart illustrating an exemplary embodiment of the present invention.

Figure 299:
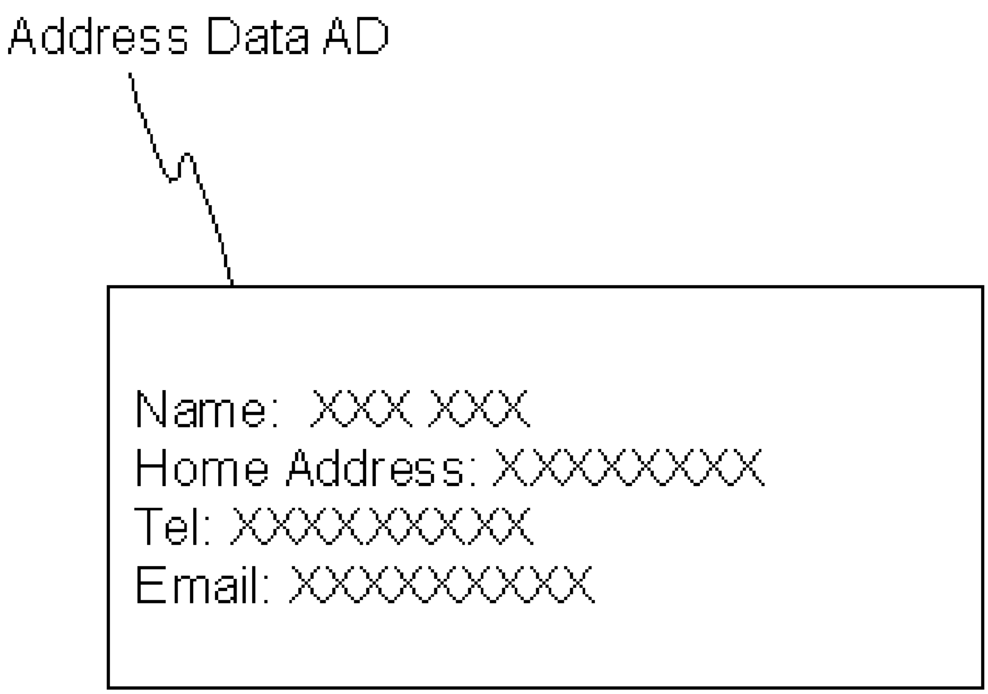

FIG. 299 is a simplified illustration illustrating an exemplary embodiment of the present invention.

Figure 300:
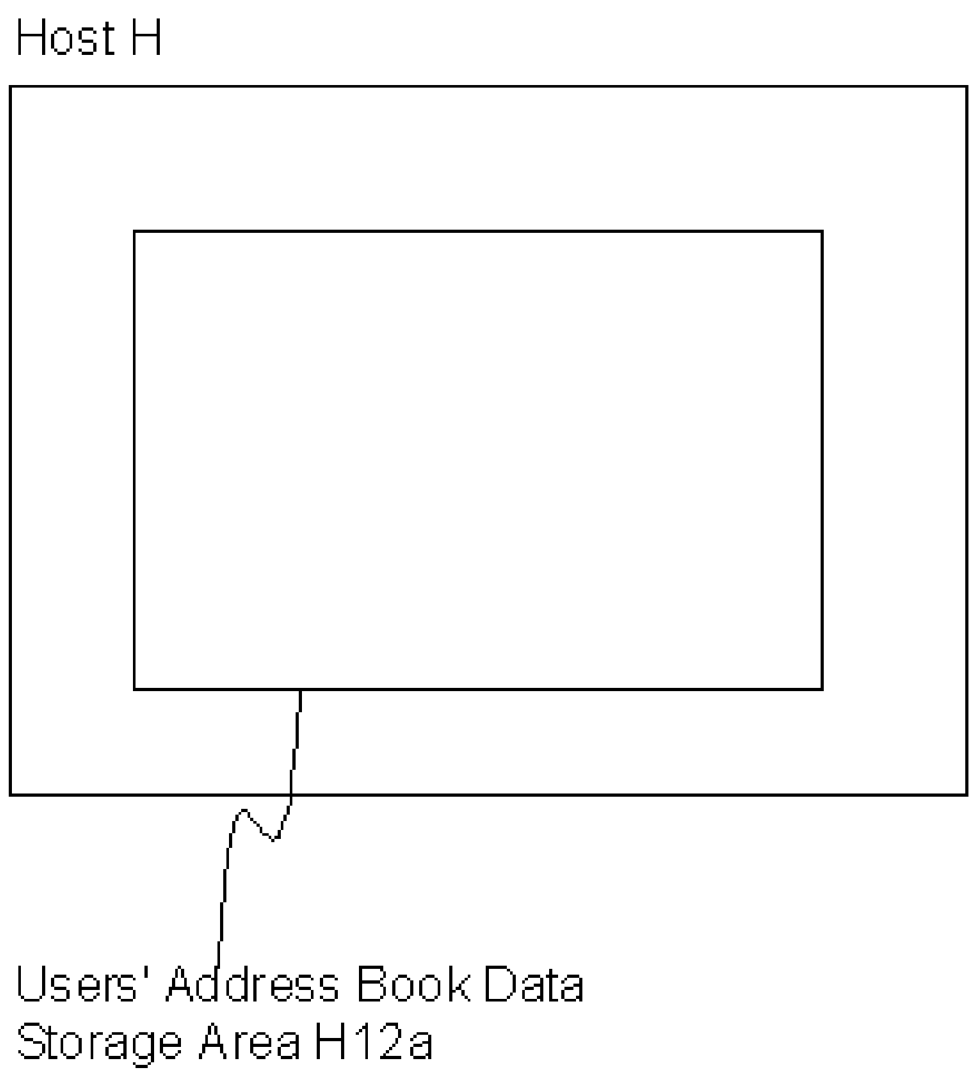

FIG. 300 is a block diagram illustrating an exemplary embodiment of the present invention.

FIG. 301 is a block diagram illustrating an exemplary embodiment of the present invention.

FIG. 302 is a block diagram illustrating an exemplary embodiment of the present invention.

Figure 303:
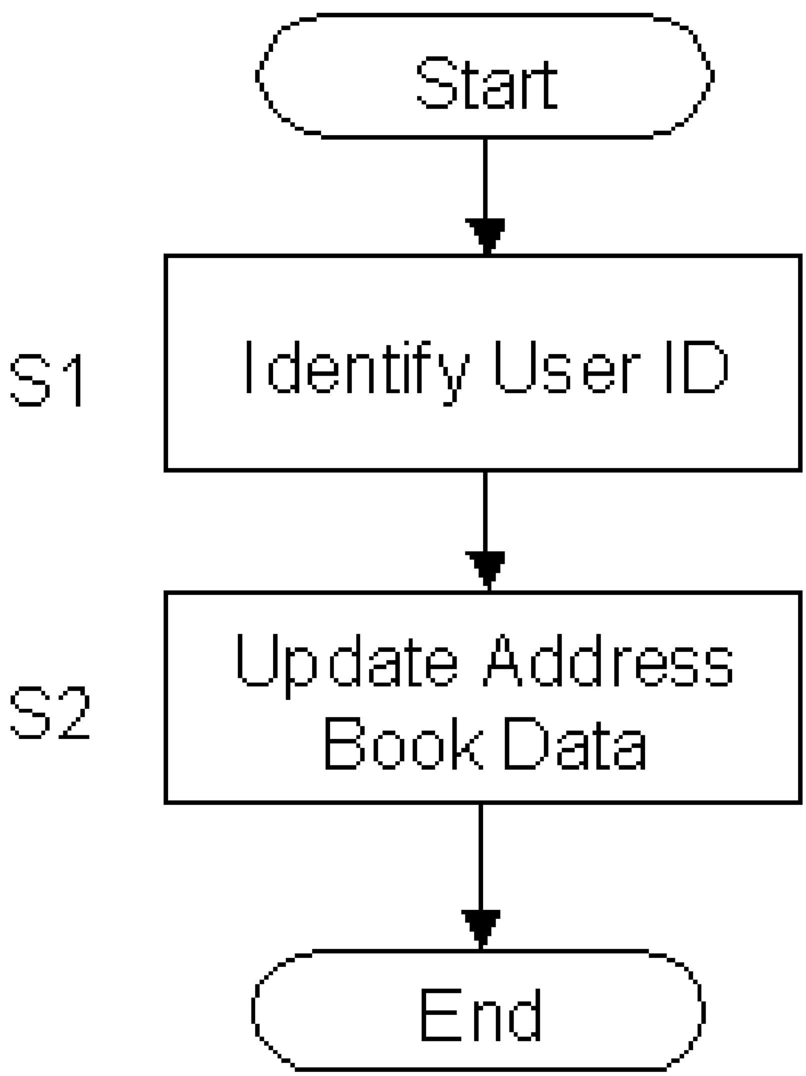

FIG. 303 is a flowchart illustrating an exemplary embodiment of the present invention.

FIG. 304 is a block diagram illustrating an exemplary embodiment of the present invention.

Figure 305:
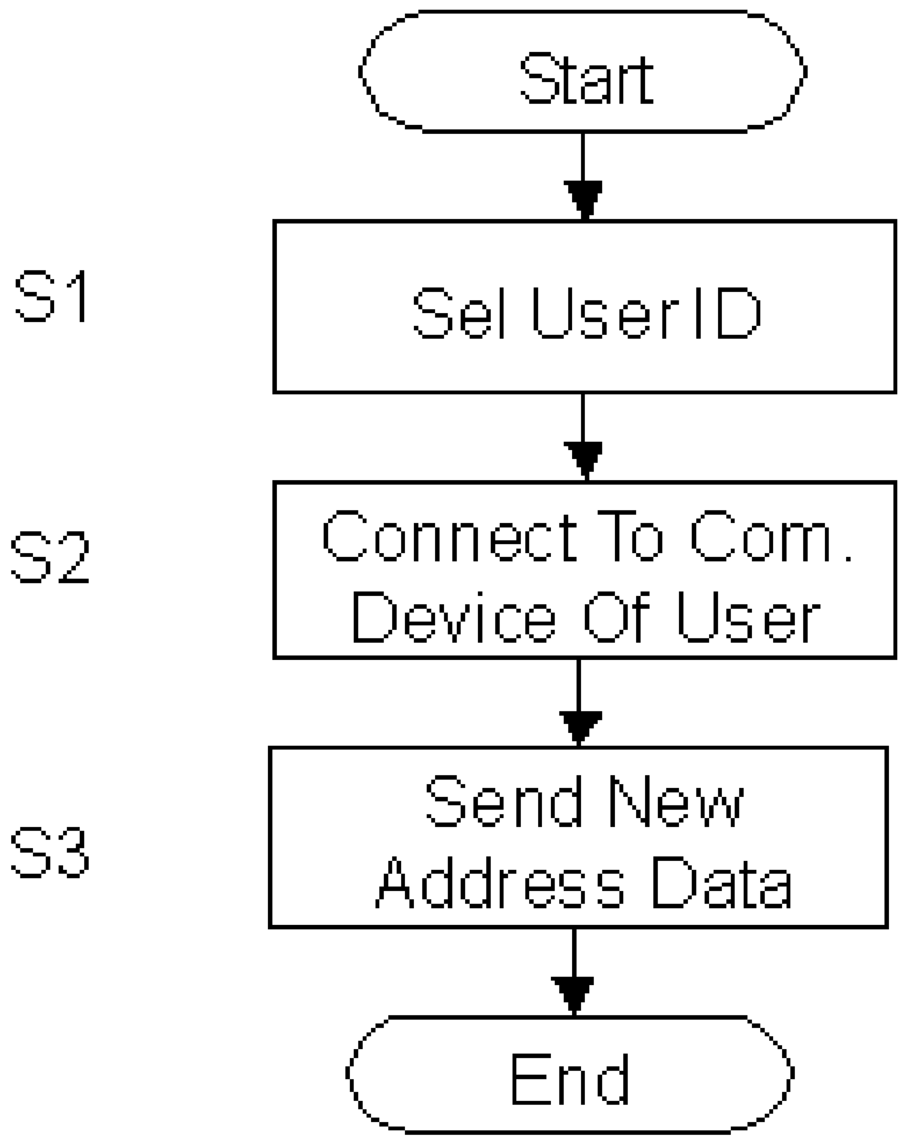

FIG. 305 is a flowchart illustrating an exemplary embodiment of the present invention.

Figure 306:
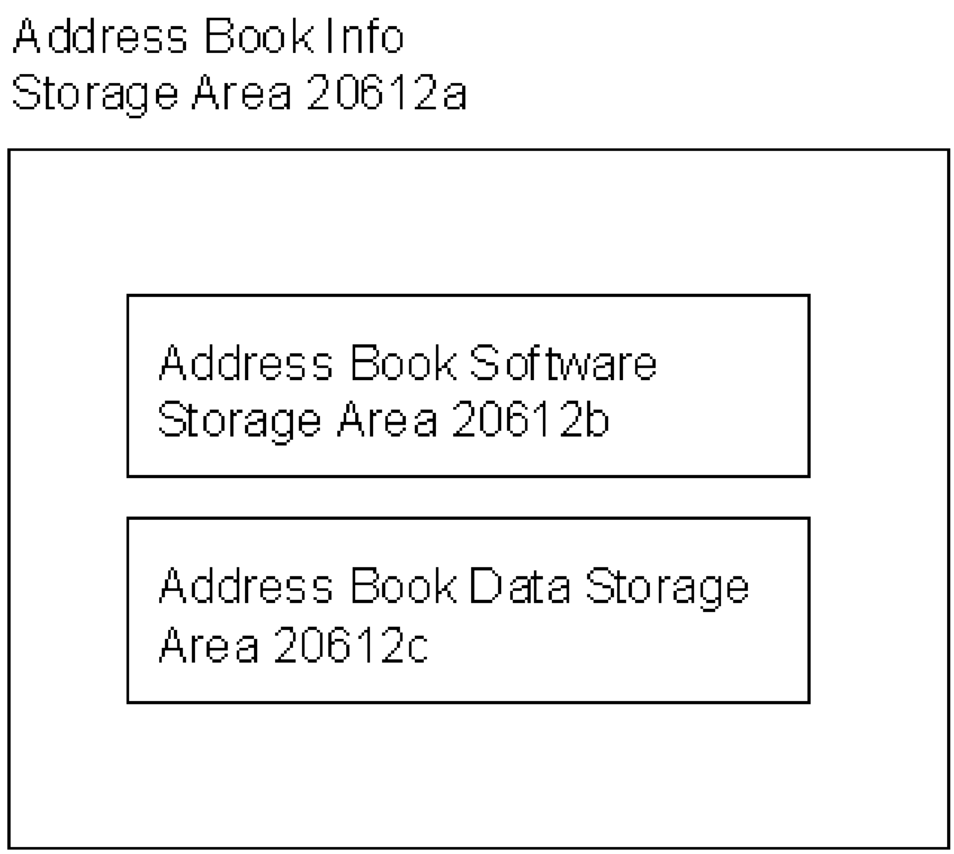

FIG. 306 is a block diagram illustrating an exemplary embodiment of the present invention.

FIG. 307 is a block diagram illustrating an exemplary embodiment of the present invention.

Figure 308:
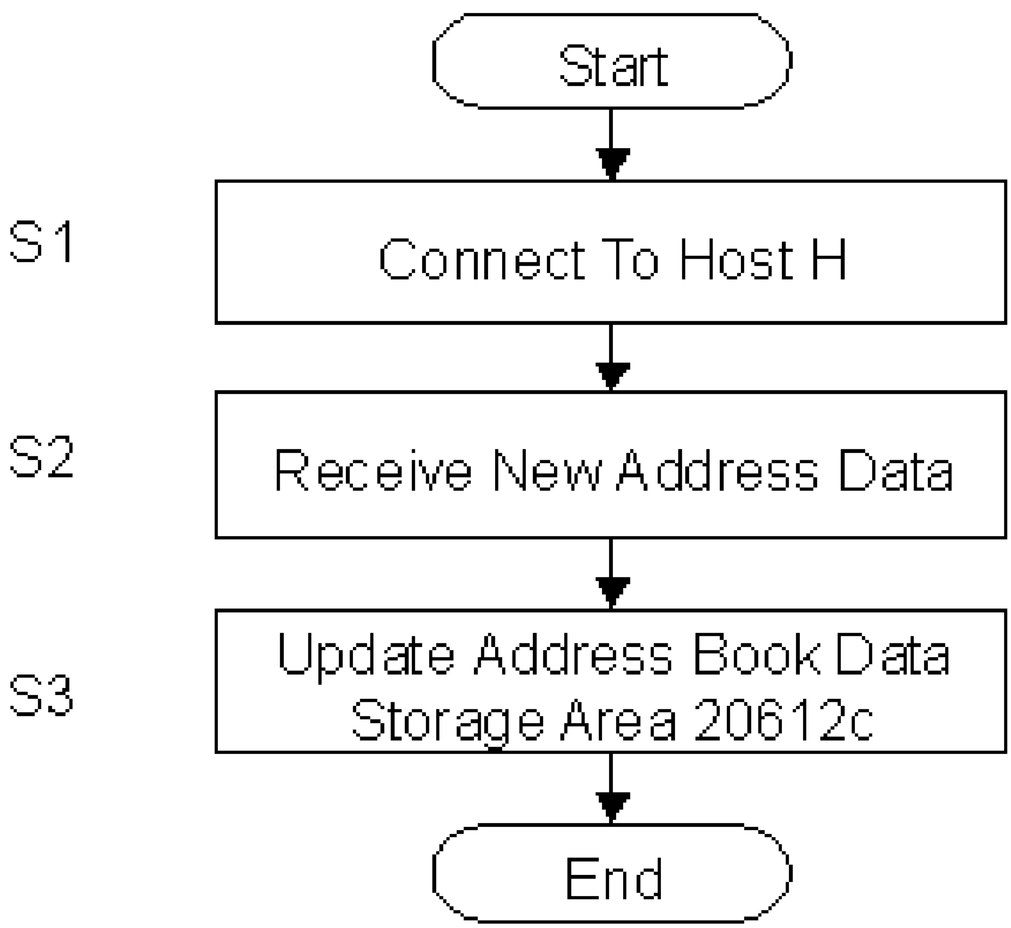

FIG. 308 is a flowchart illustrating an exemplary embodiment of the present invention.

FIG. 309 is a block diagram illustrating an exemplary embodiment of the present invention.

Figure 310:
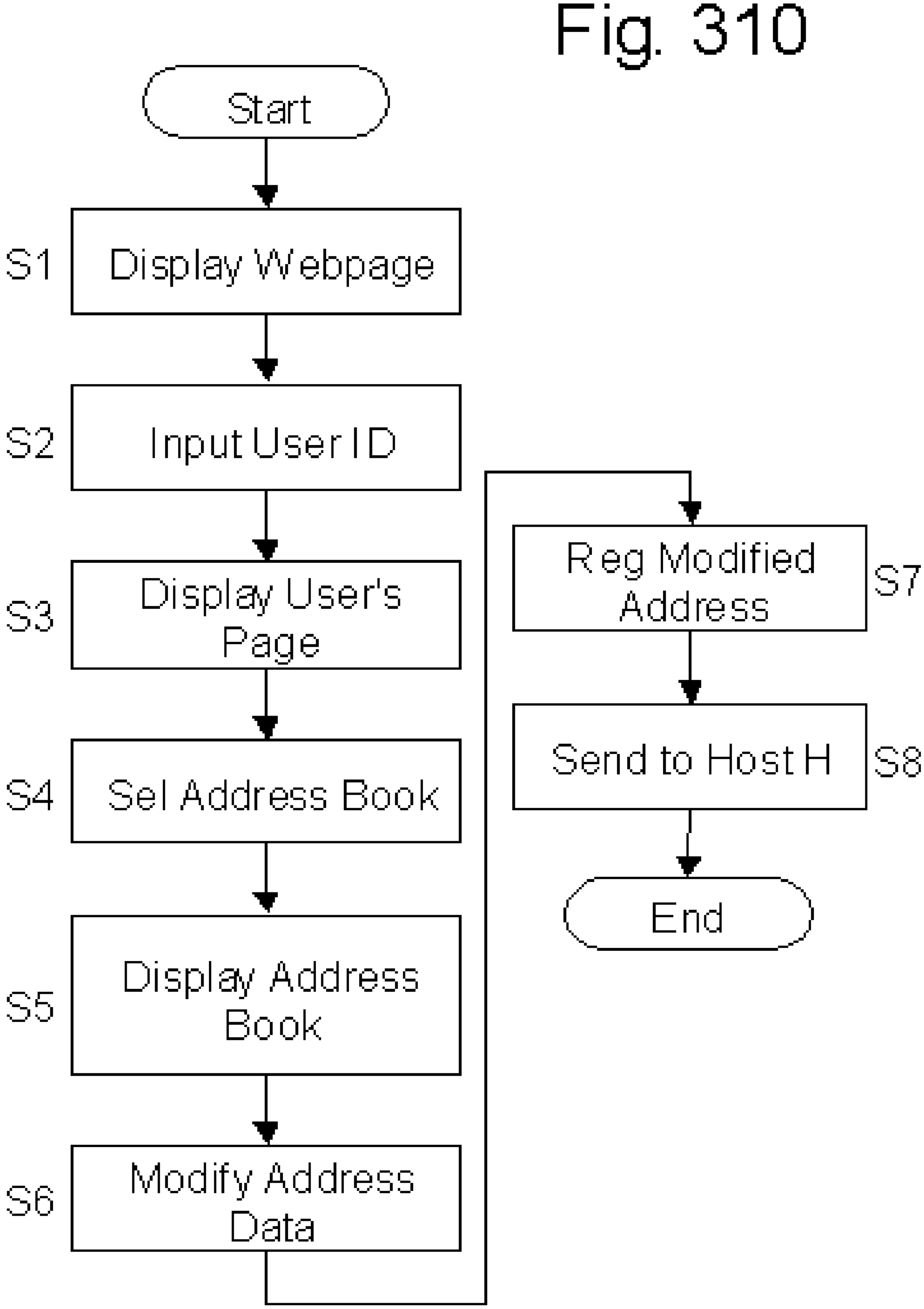

FIG. 310 is a flowchart illustrating an exemplary embodiment of the present invention.

FIG. 311 is a block diagram illustrating an exemplary embodiment of the present invention.

FIG. 312 is a block diagram illustrating an exemplary embodiment of the present invention.

Figure 313:
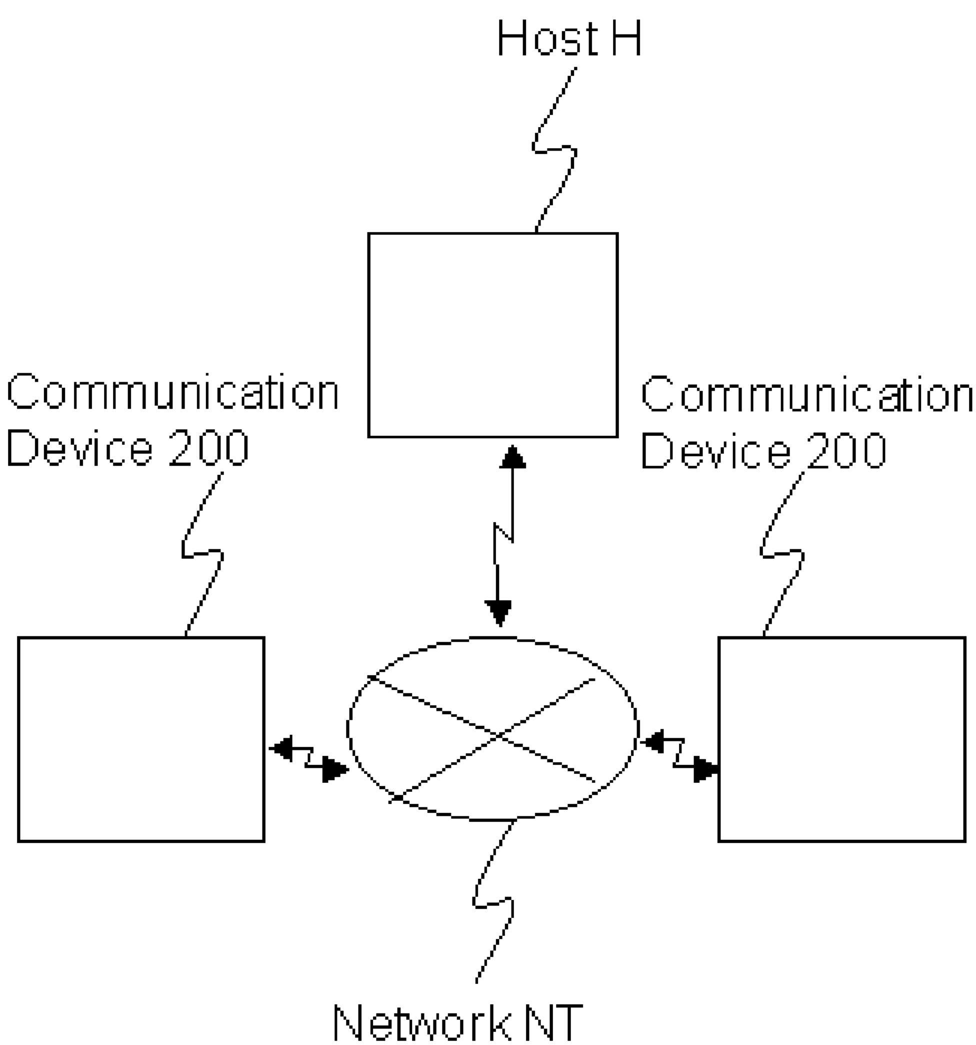

FIG. 313 is a simplified illustration illustrating an exemplary embodiment of the present invention.

Figure 314:
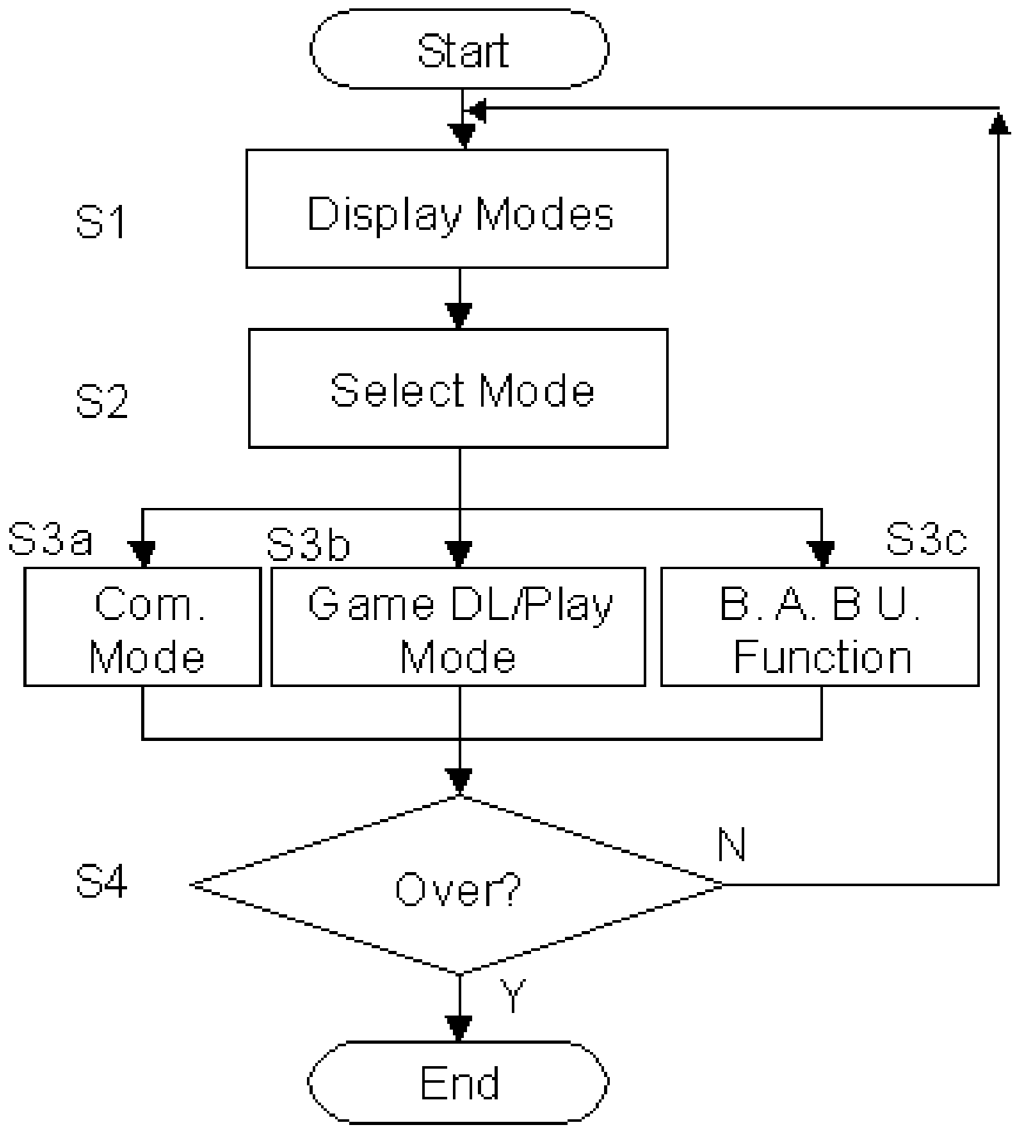

FIG. 314 is a flowchart illustrating an exemplary embodiment of the present invention.

Figure 315:
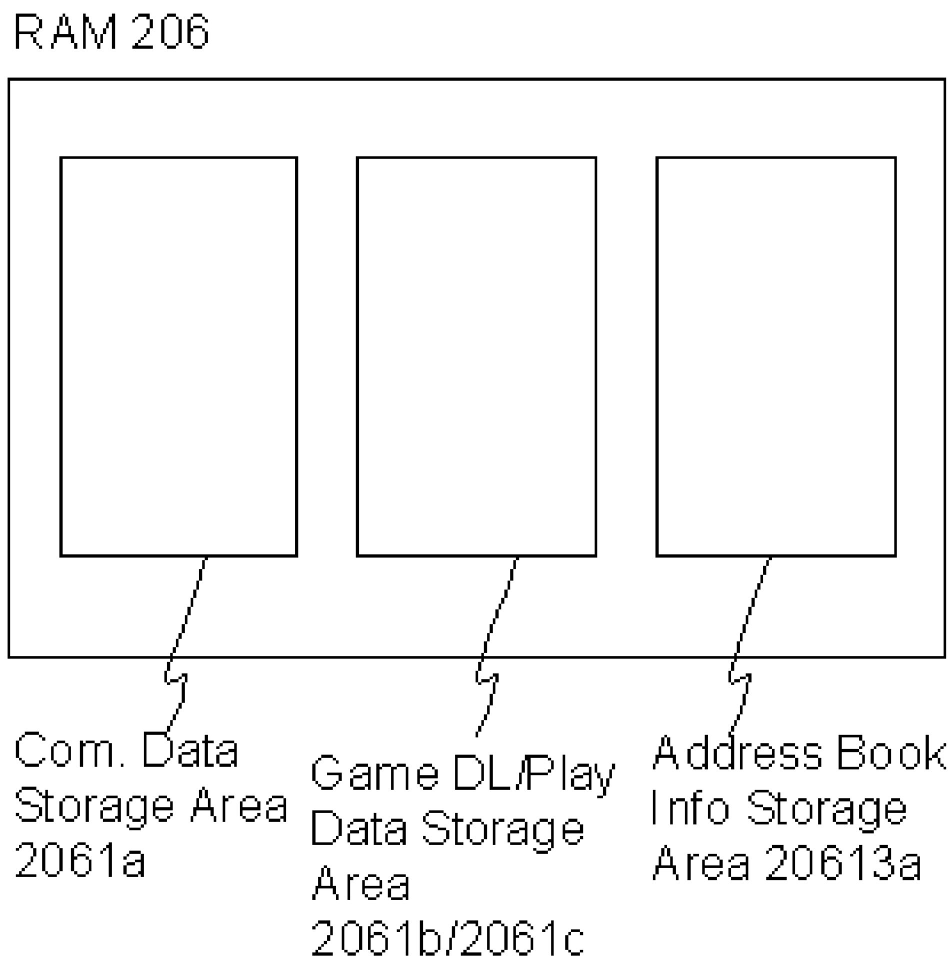

FIG. 315 is a block diagram illustrating an exemplary embodiment of the present invention.

Figure 316:
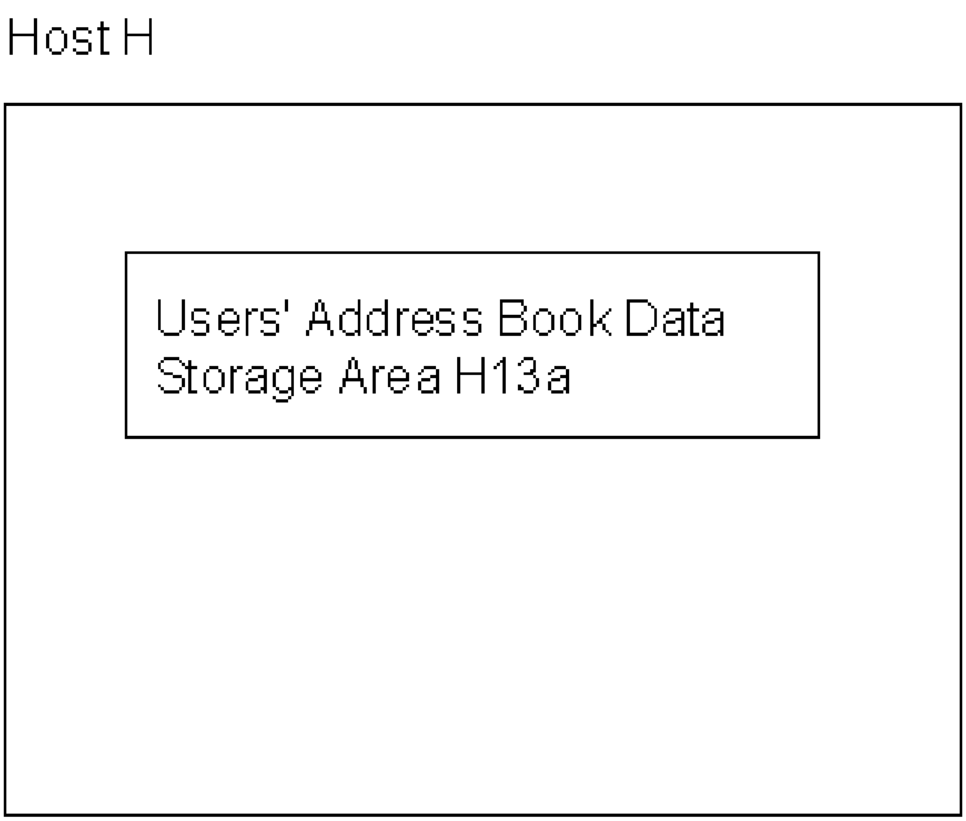

FIG. 316 is a block diagram illustrating an exemplary embodiment of the present invention.

FIG. 317 is a block diagram illustrating an exemplary embodiment of the present invention.

Figure 318:
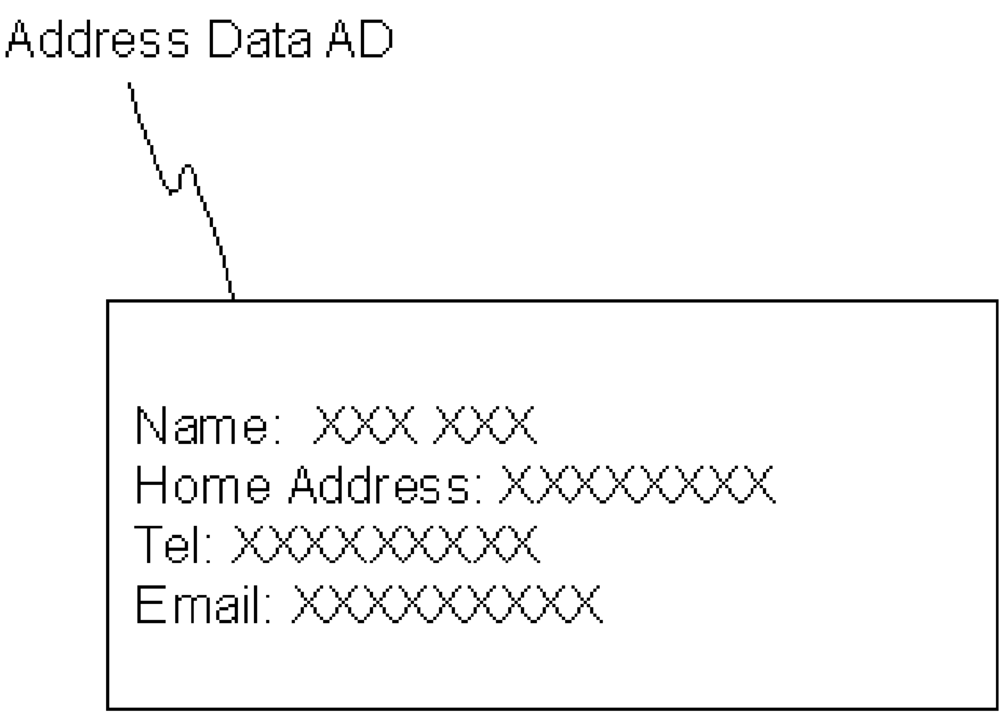

FIG. 318 is a simplified illustration illustrating an exemplary embodiment of the present invention.

FIG. 319 is a block diagram illustrating an exemplary embodiment of the present invention.

Figure 320:
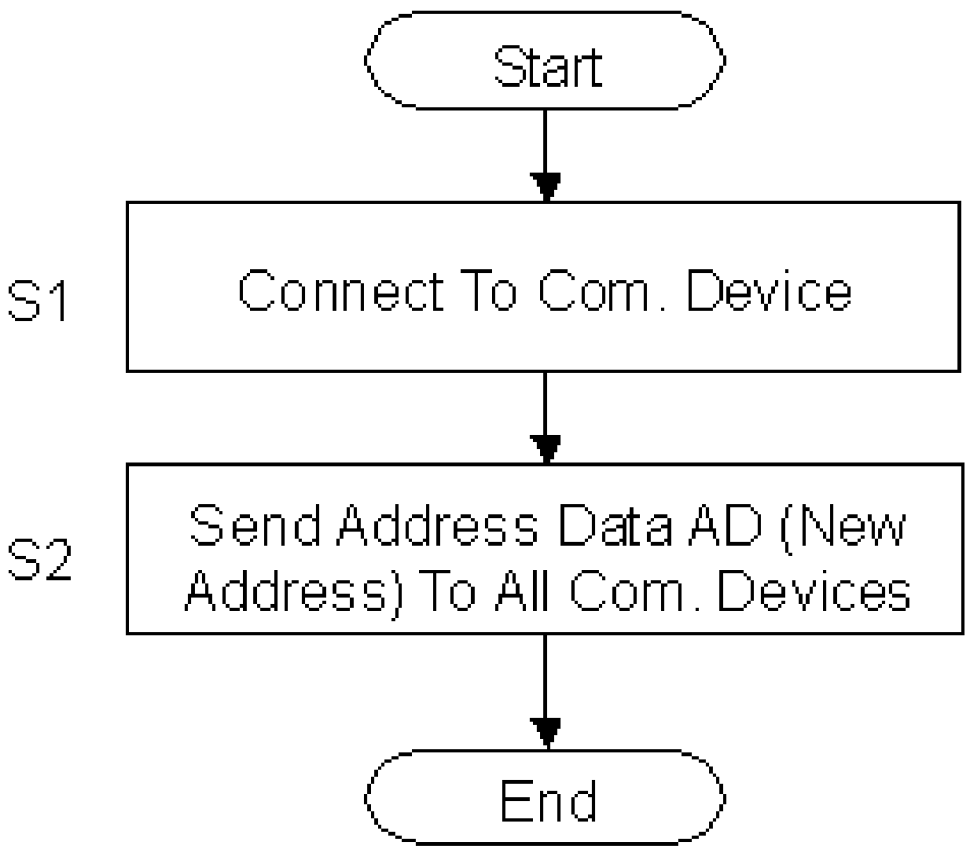

FIG. 320 is a flowchart illustrating an exemplary embodiment of the present invention.

Figure 321:
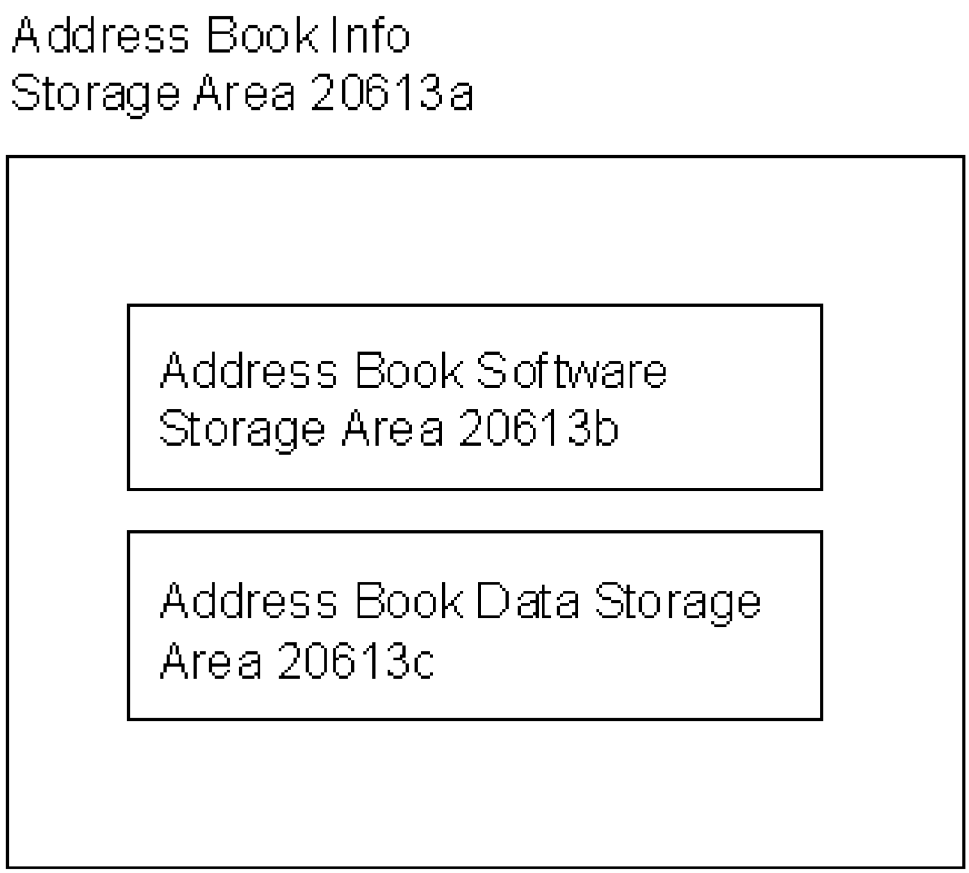

FIG. 321 is a block diagram illustrating an exemplary embodiment of the present invention.

FIG. 322 is a block diagram illustrating an exemplary embodiment of the present invention.

Figure 323:
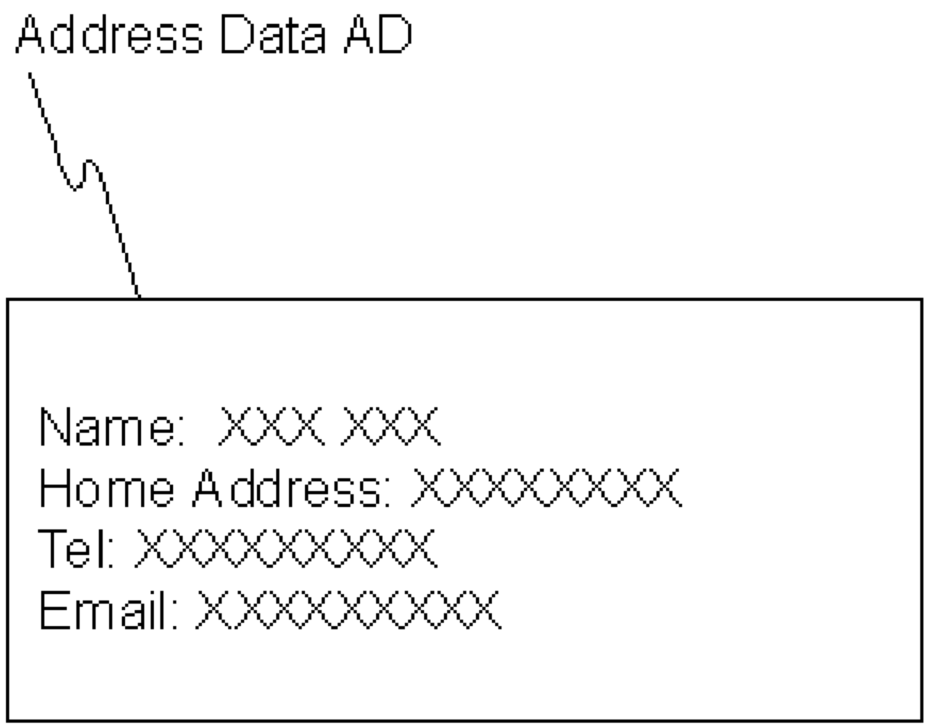

FIG. 323 is a simplified illustration illustrating an exemplary embodiment of the present invention.

Figure 324:
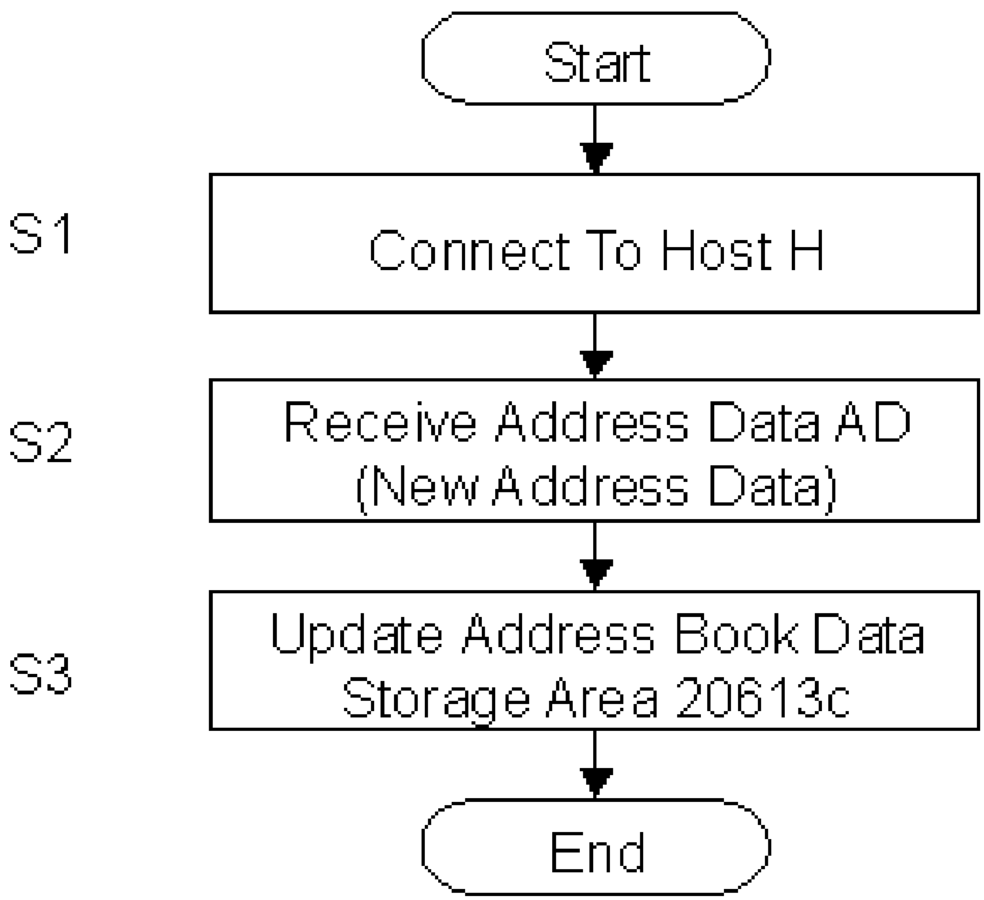

FIG. 324 is a flowchart illustrating an exemplary embodiment of the present invention.

FIG. 325 is a block diagram illustrating an exemplary embodiment of the present invention.

FIG. 326 is a block diagram illustrating an exemplary embodiment of the present invention.

Figure 327:
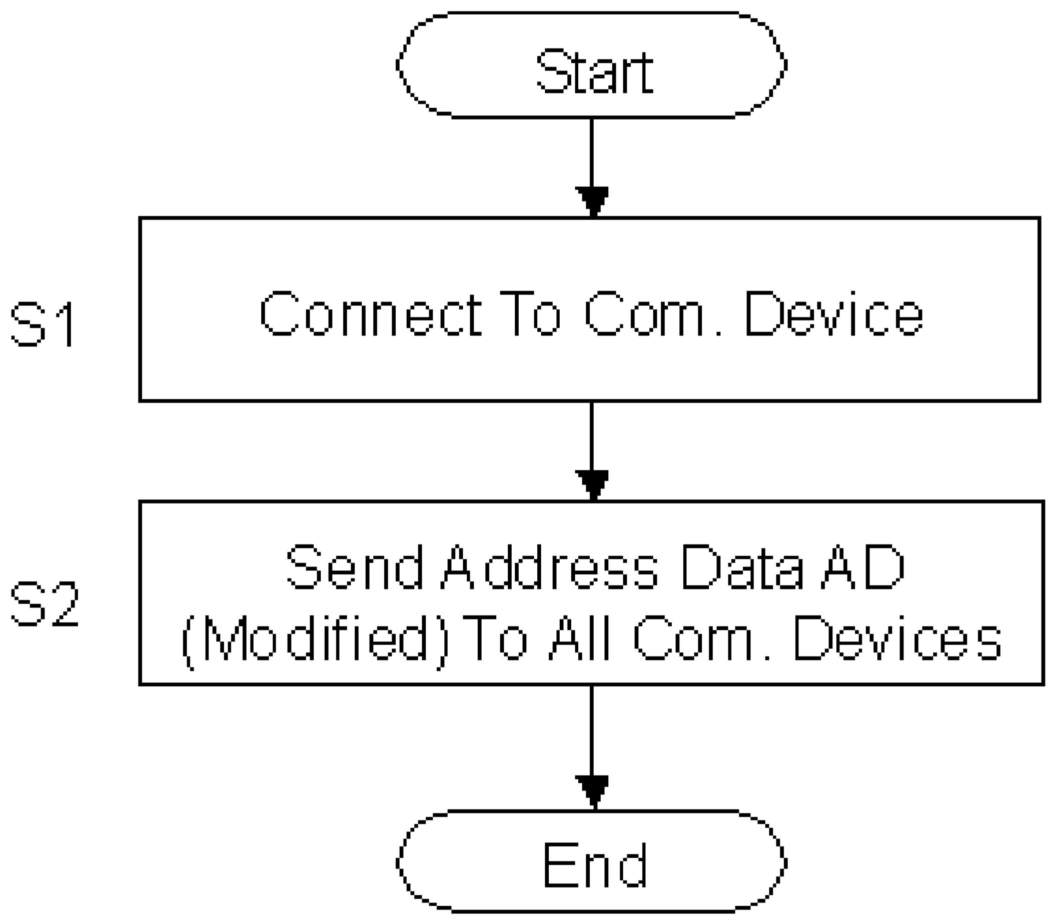

FIG. 327 is a flowchart illustrating an exemplary embodiment of the present invention.

Figure 328:
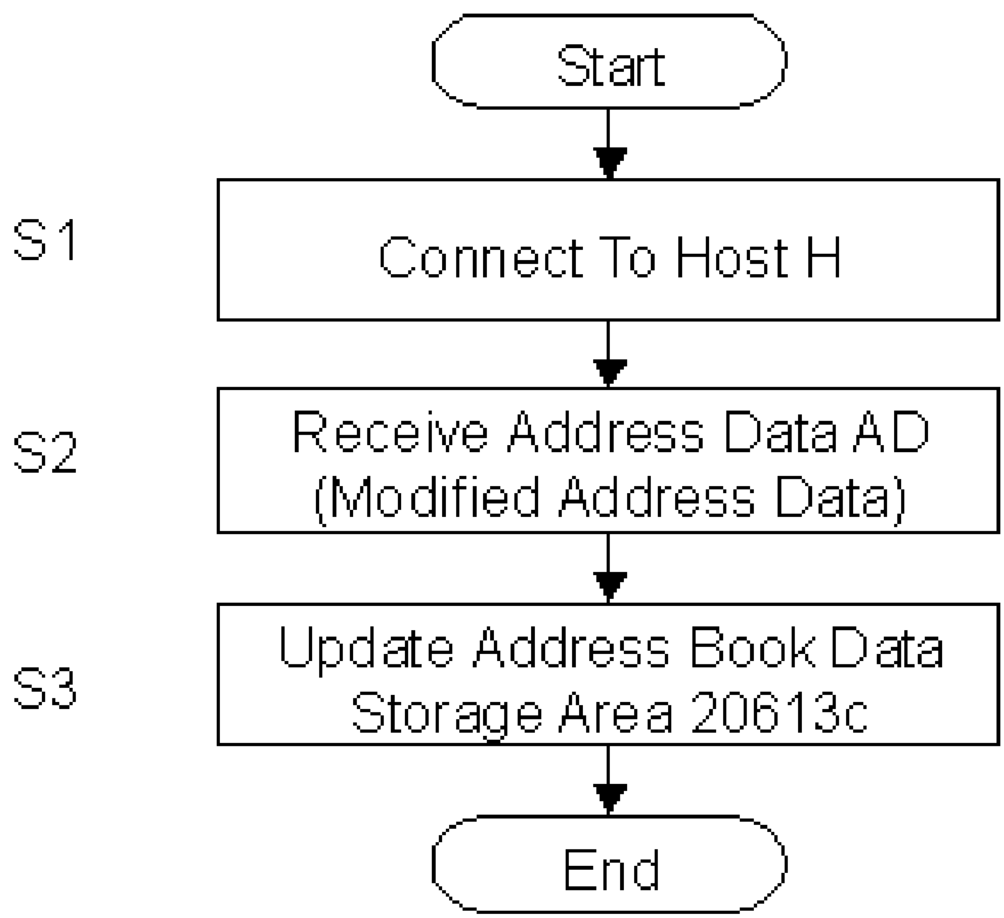

FIG. 328 is a flowchart illustrating an exemplary embodiment of the present invention.

FIG. 329 is a block diagram illustrating an exemplary embodiment of the present invention.

Figure 329A:
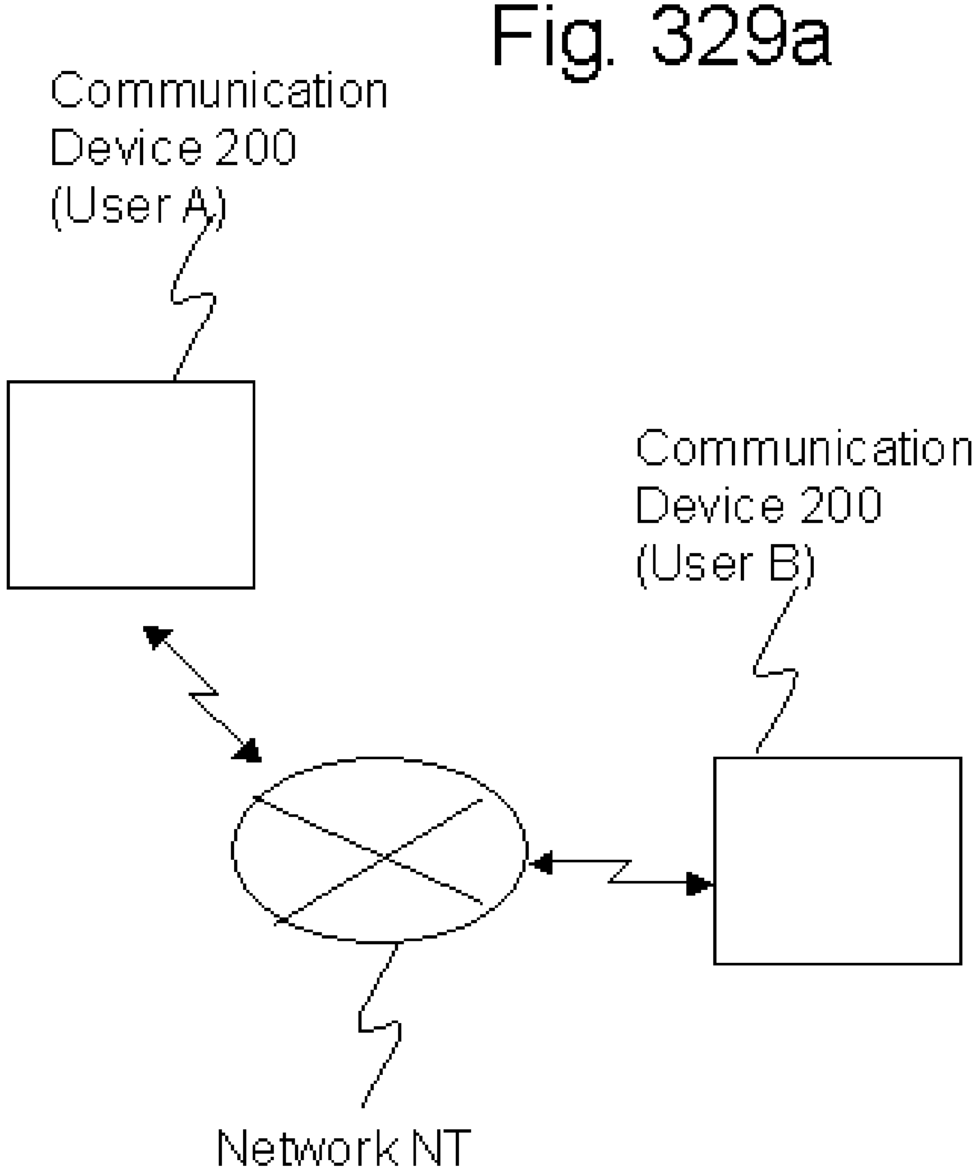

FIG. 329*a* is a simplified illustration illustrating an exemplary embodiment of the present invention.

Figure 329B:
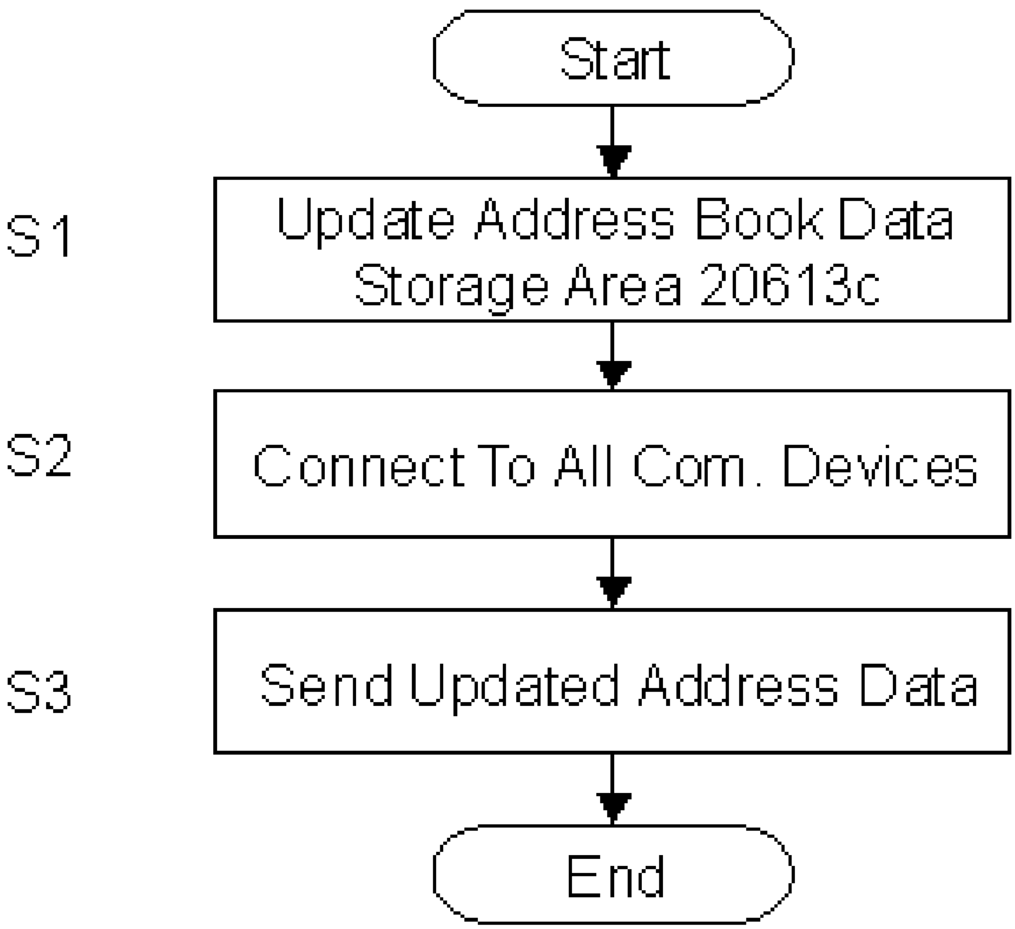

FIG. 329*b* is a flowchart illustrating an exemplary embodiment of the present invention.

Figure 329C:
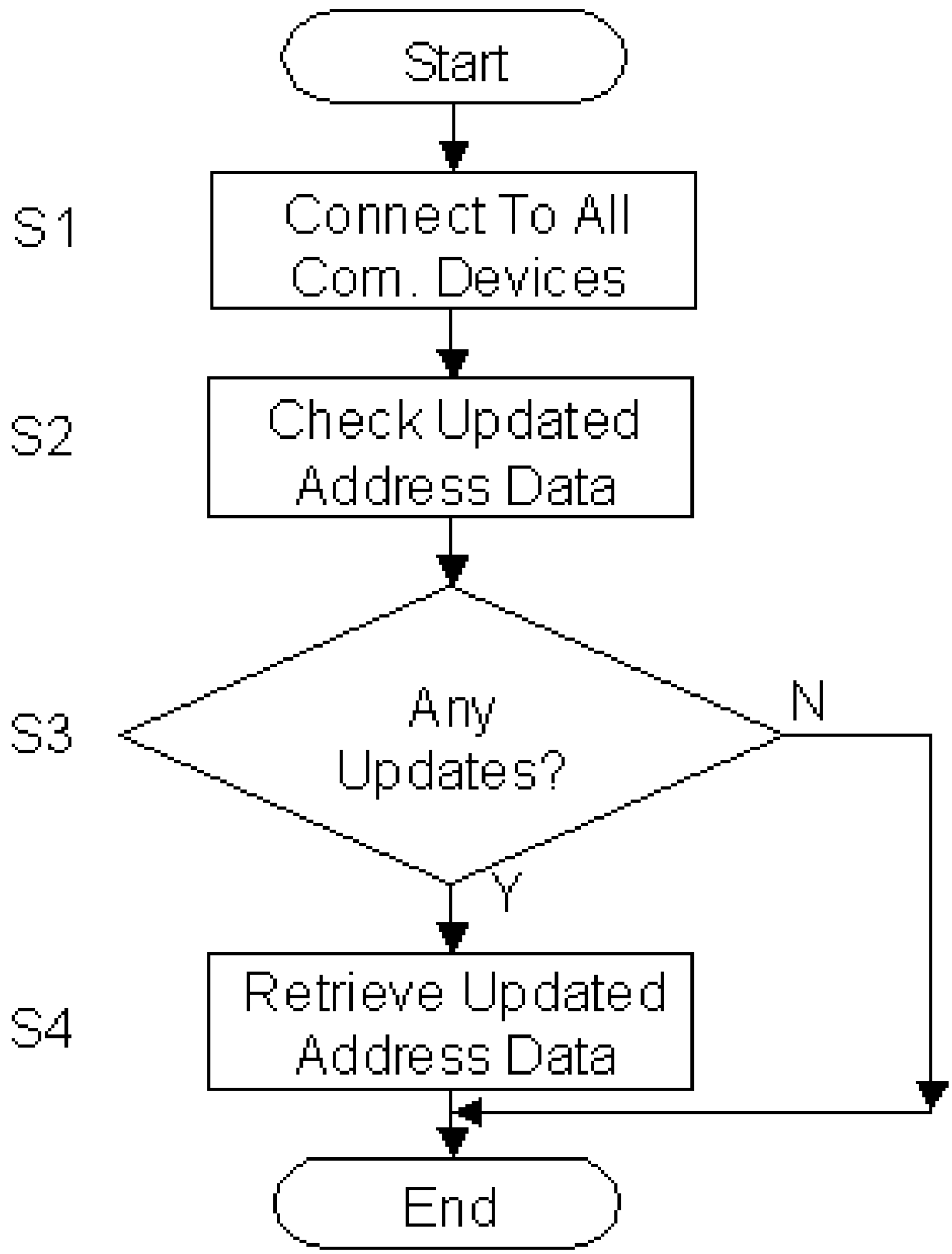

FIG. 329*c* is a flowchart illustrating an exemplary embodiment of the present invention.

Figure 330:
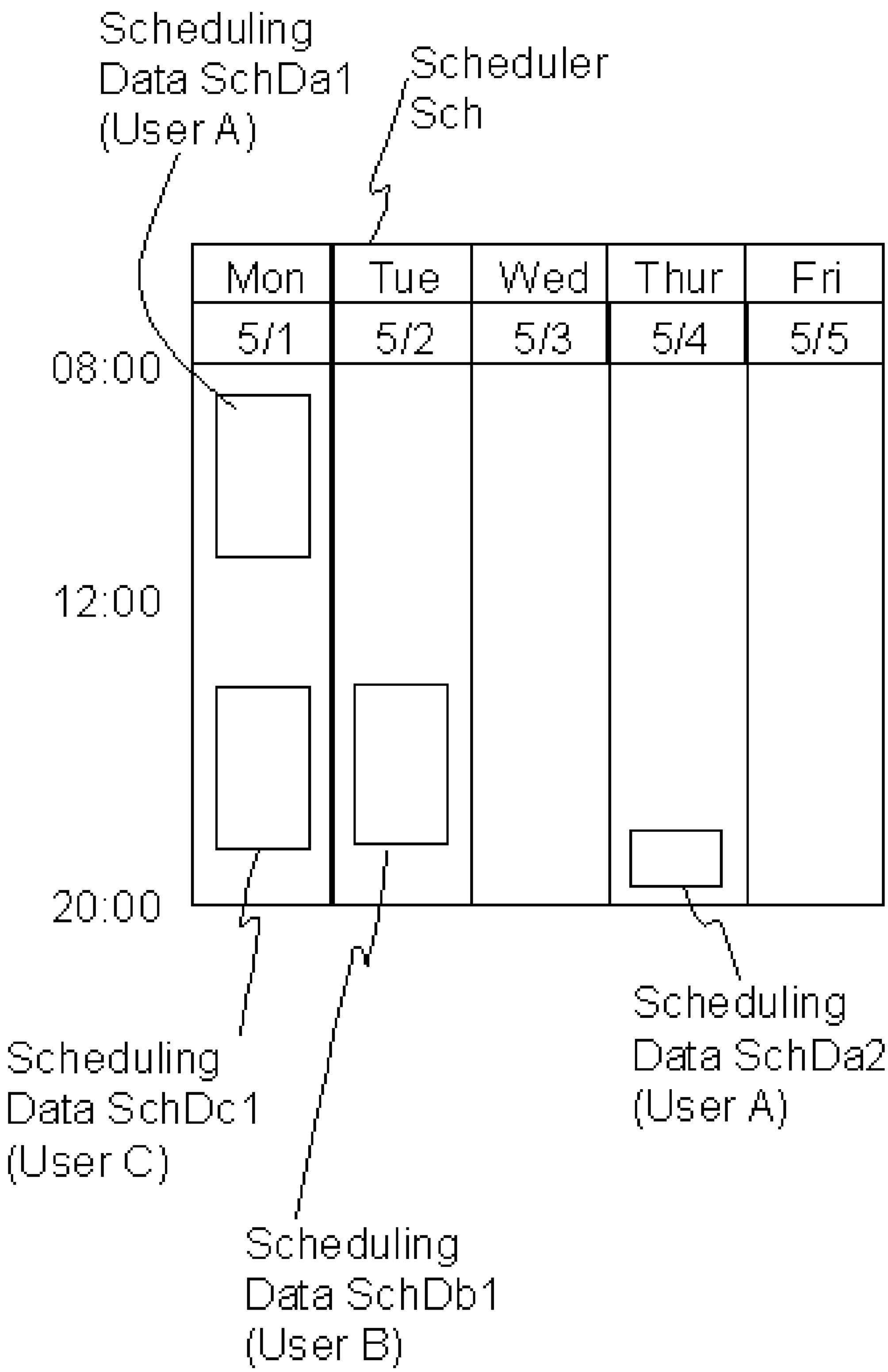

FIG. 330 is a simplified illustration illustrating an exemplary embodiment of the present invention.

Figure 331:
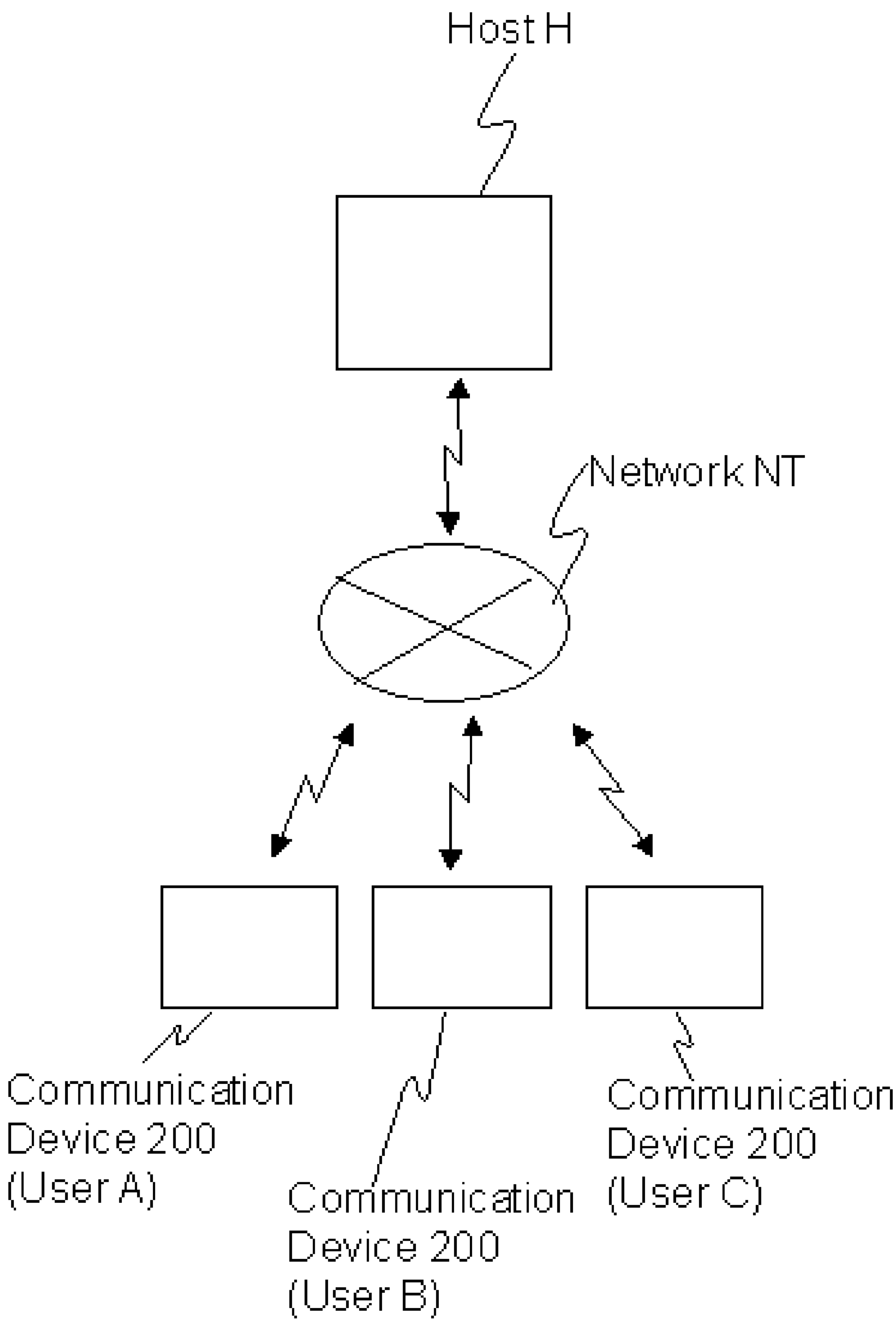

FIG. 331 is a simplified illustration illustrating an exemplary embodiment of the present invention.

Figure 332:
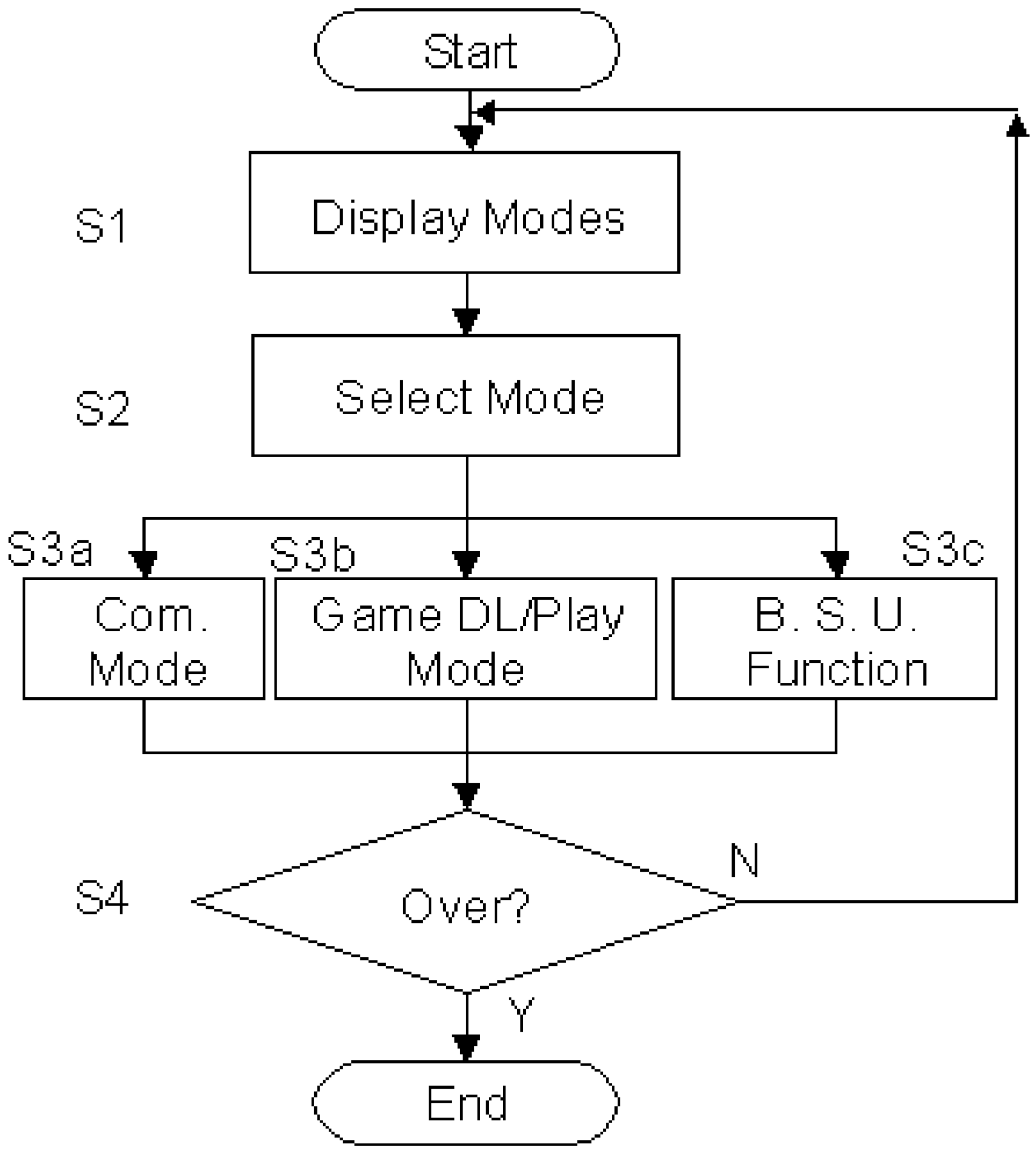

FIG. 332 is a flowchart illustrating an exemplary embodiment of the present invention.

Figure 333:
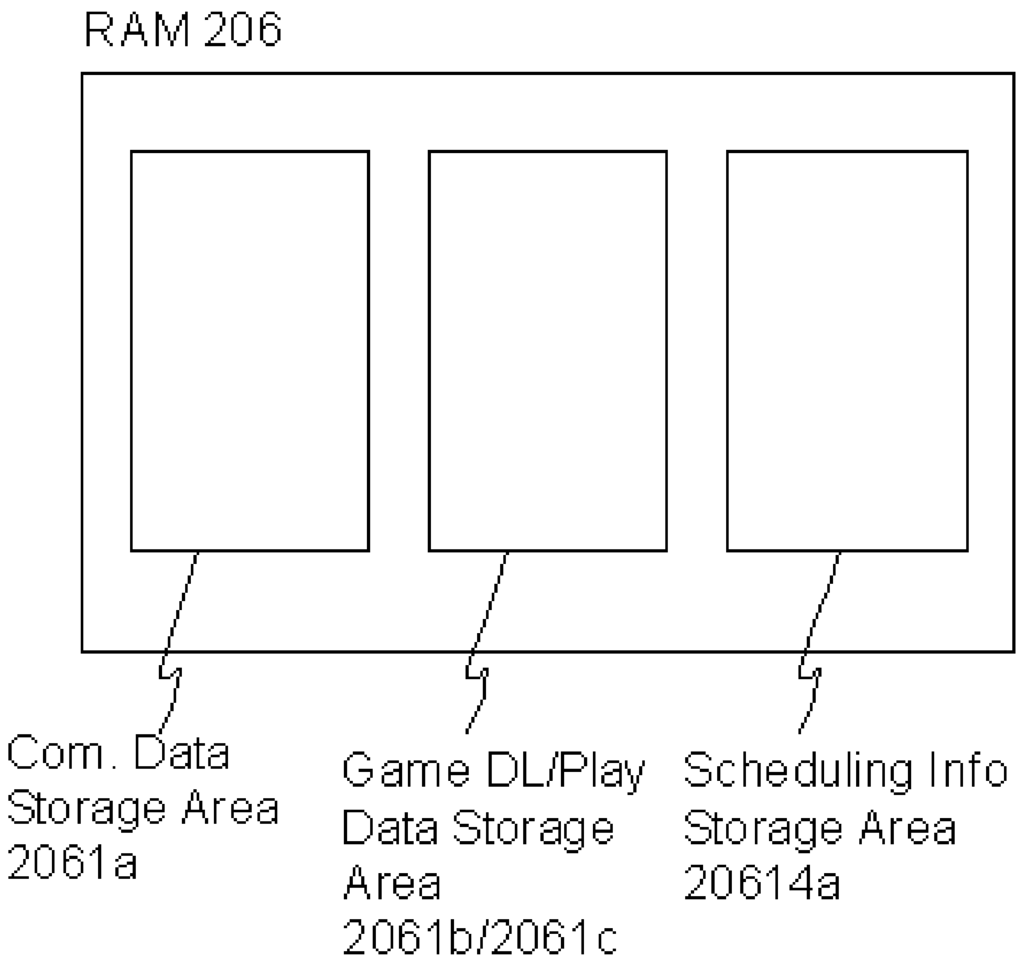

FIG. 333 is a block diagram illustrating an exemplary embodiment of the present invention.

Figure 334:
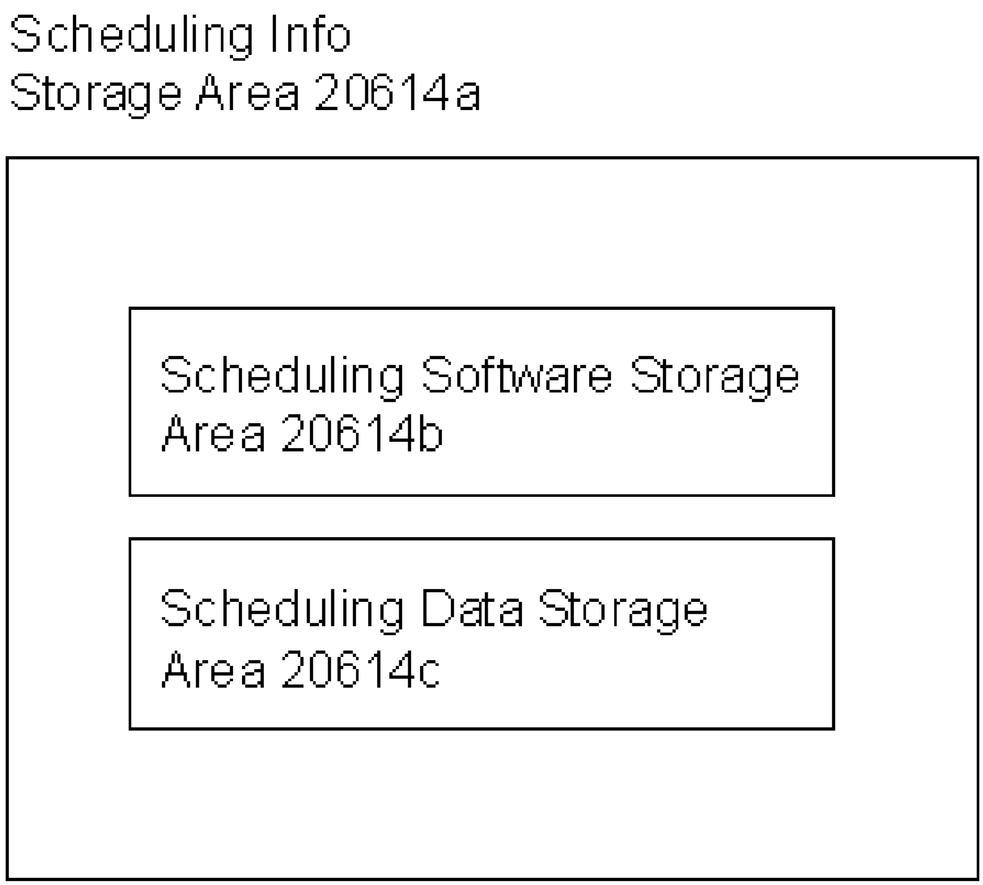

FIG. 334 is a block diagram illustrating an exemplary embodiment of the present invention.

FIG. 335 is a block diagram illustrating an exemplary embodiment of the present invention.

Figure 336:
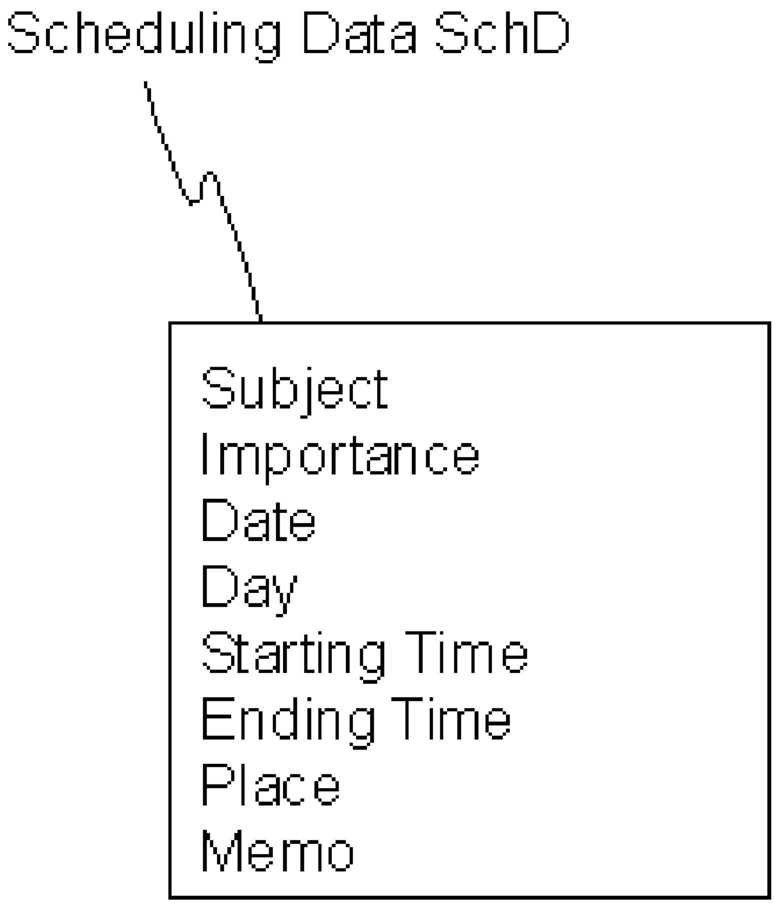

FIG. 336 is a simplified illustration illustrating an exemplary embodiment of the present invention.

FIG. 337 is a simplified illustration illustrating an exemplary embodiment of the present invention.

FIG. 338 is a simplified illustration illustrating an exemplary embodiment of the present invention.

FIG. 339 is a simplified illustration illustrating an exemplary embodiment of the present invention.

FIG. 340 is a simplified illustration illustrating an exemplary embodiment of the present invention.

Figure 341:
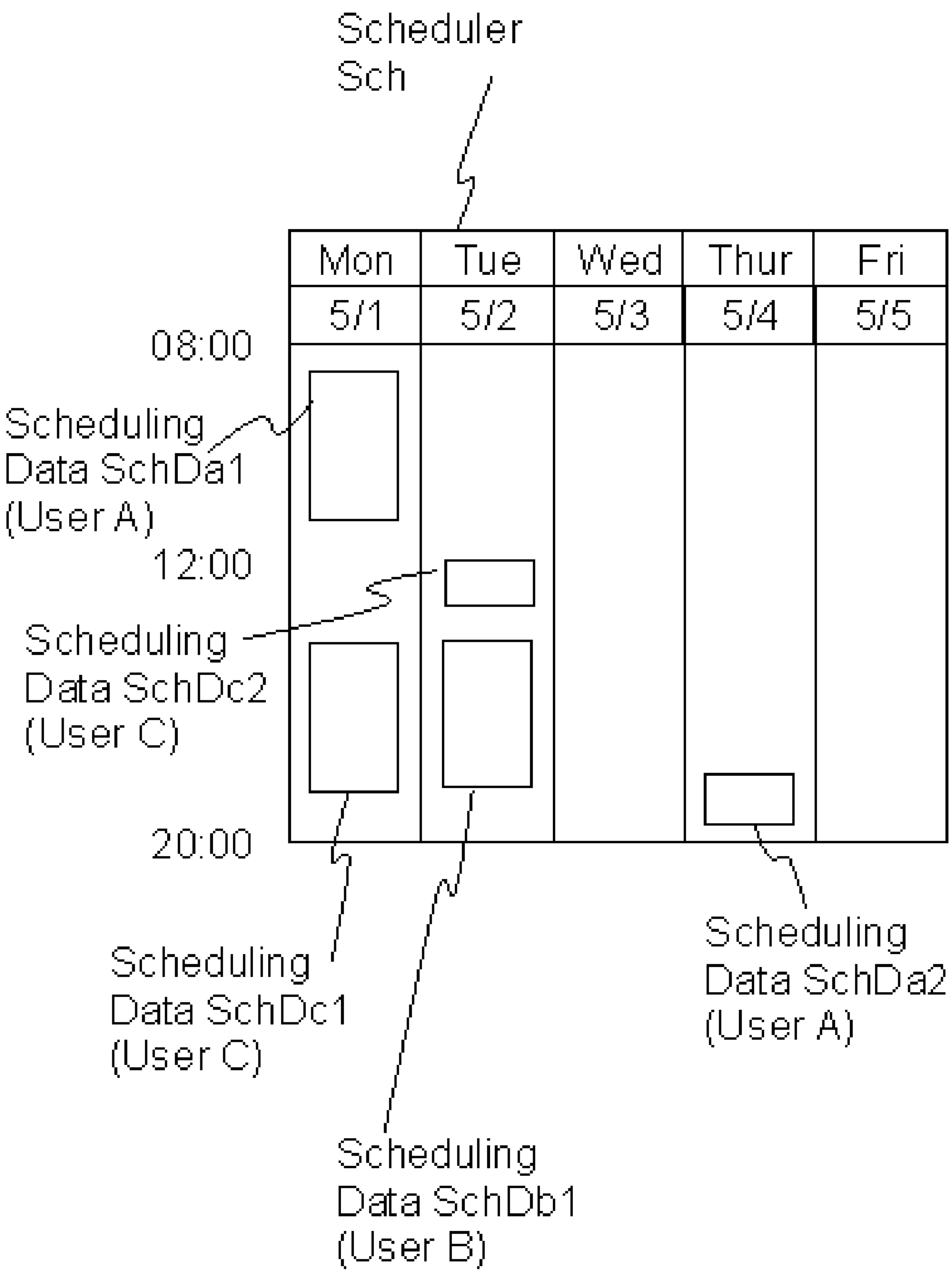

FIG. 341 is a simplified illustration illustrating an exemplary embodiment of the present invention.

FIG. 342 is a simplified illustration illustrating an exemplary embodiment of the present invention.

Figure 343:
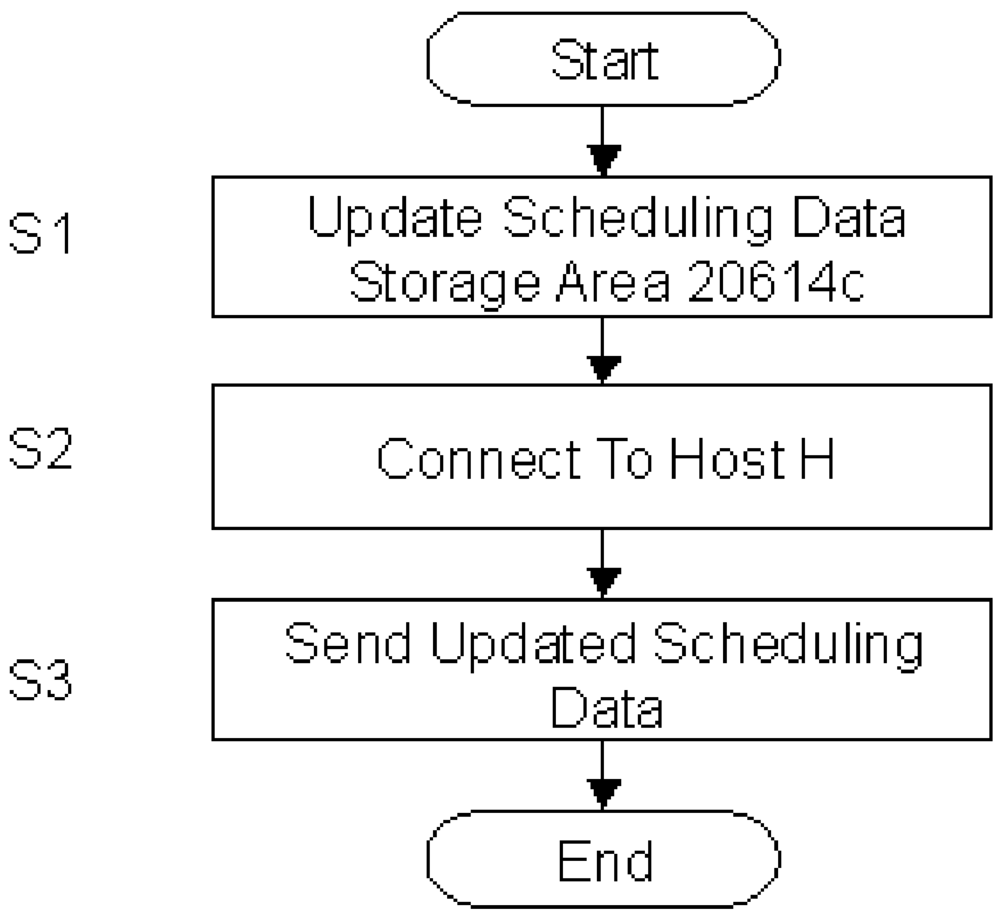

FIG. 343 is a flowchart illustrating an exemplary embodiment of the present invention.

Figure 344:
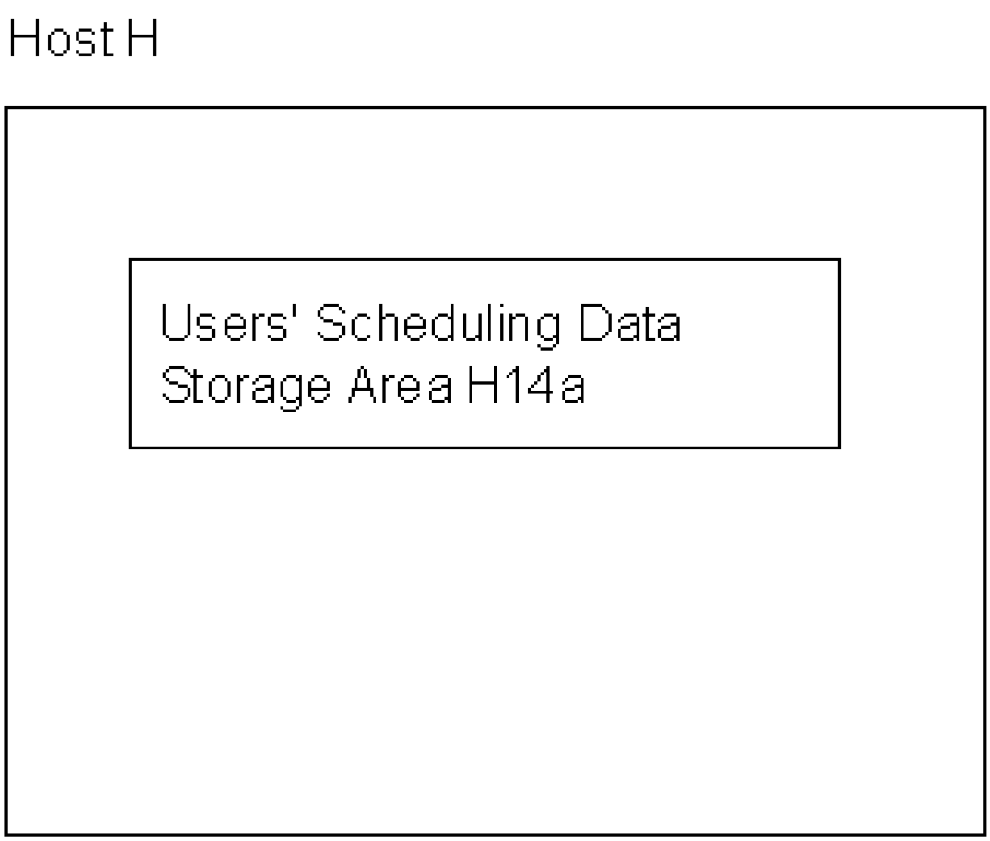

FIG. 344 is a block diagram illustrating an exemplary embodiment of the present invention.

FIG. 345 is a block diagram illustrating an exemplary embodiment of the present invention.

Figure 346:
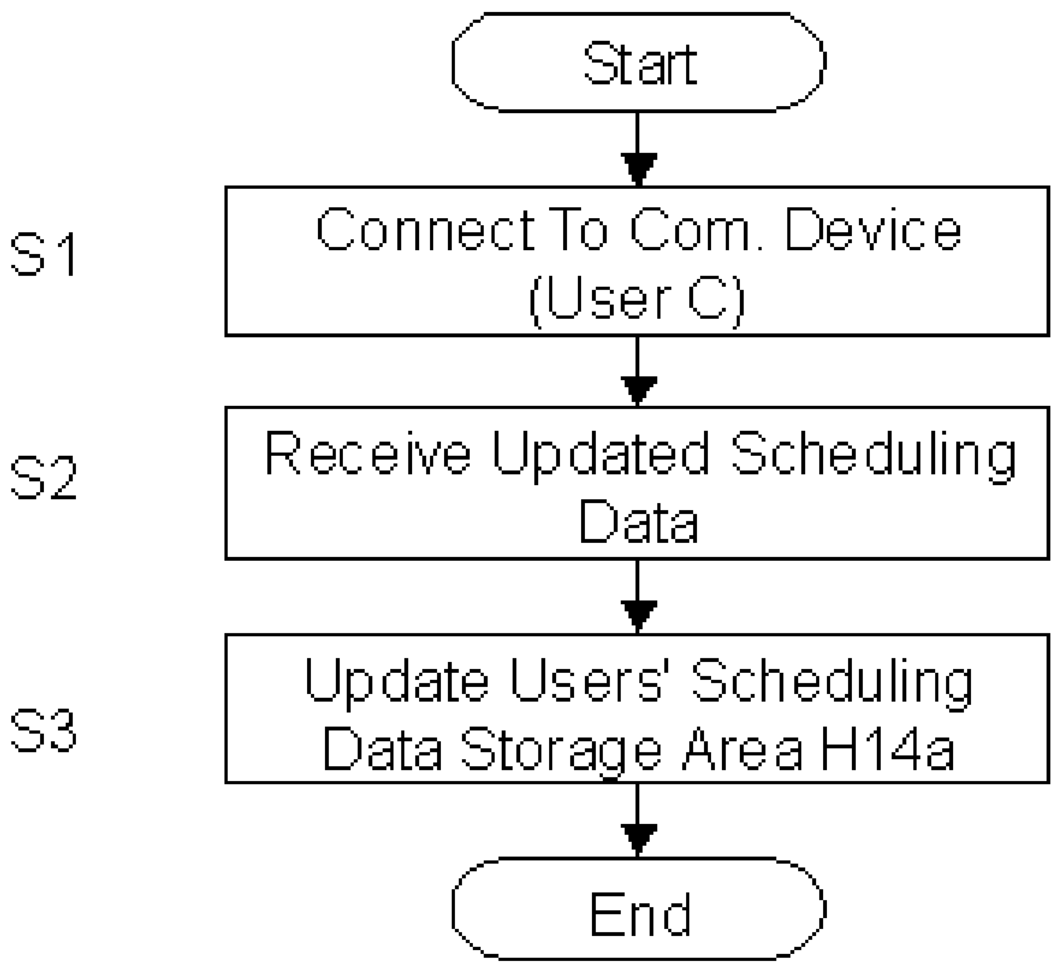

FIG. 346 is a flowchart illustrating an exemplary embodiment of the present invention.

Figure 347:
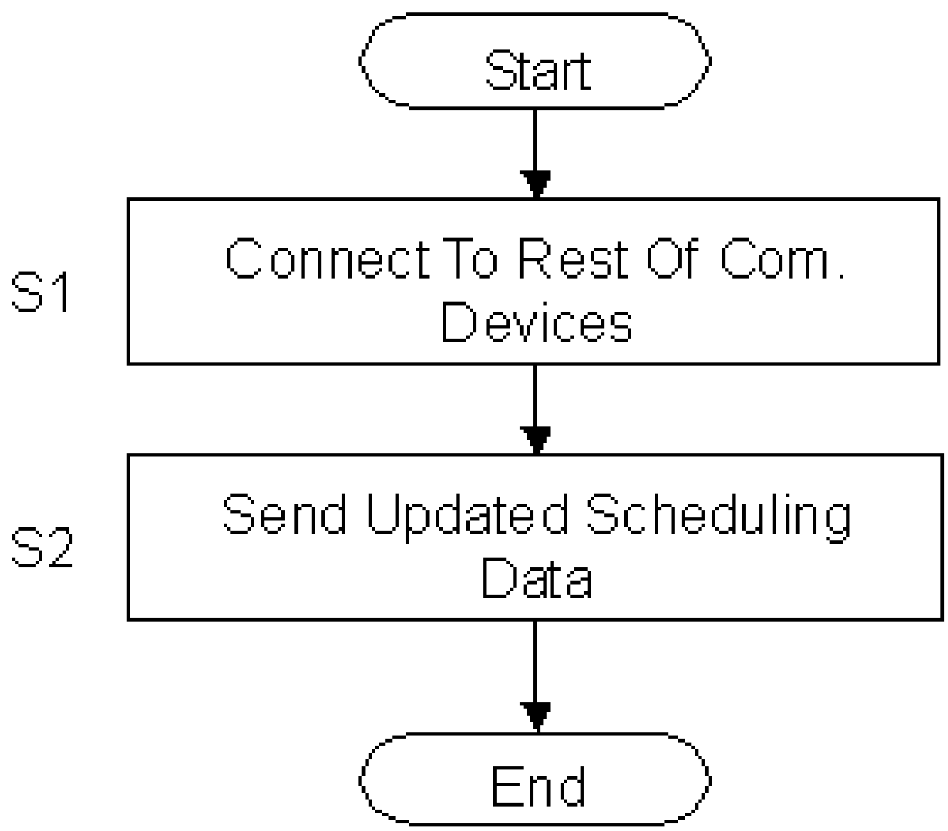

FIG. 347 is a flowchart illustrating an exemplary embodiment of the present invention.

Figure 348:
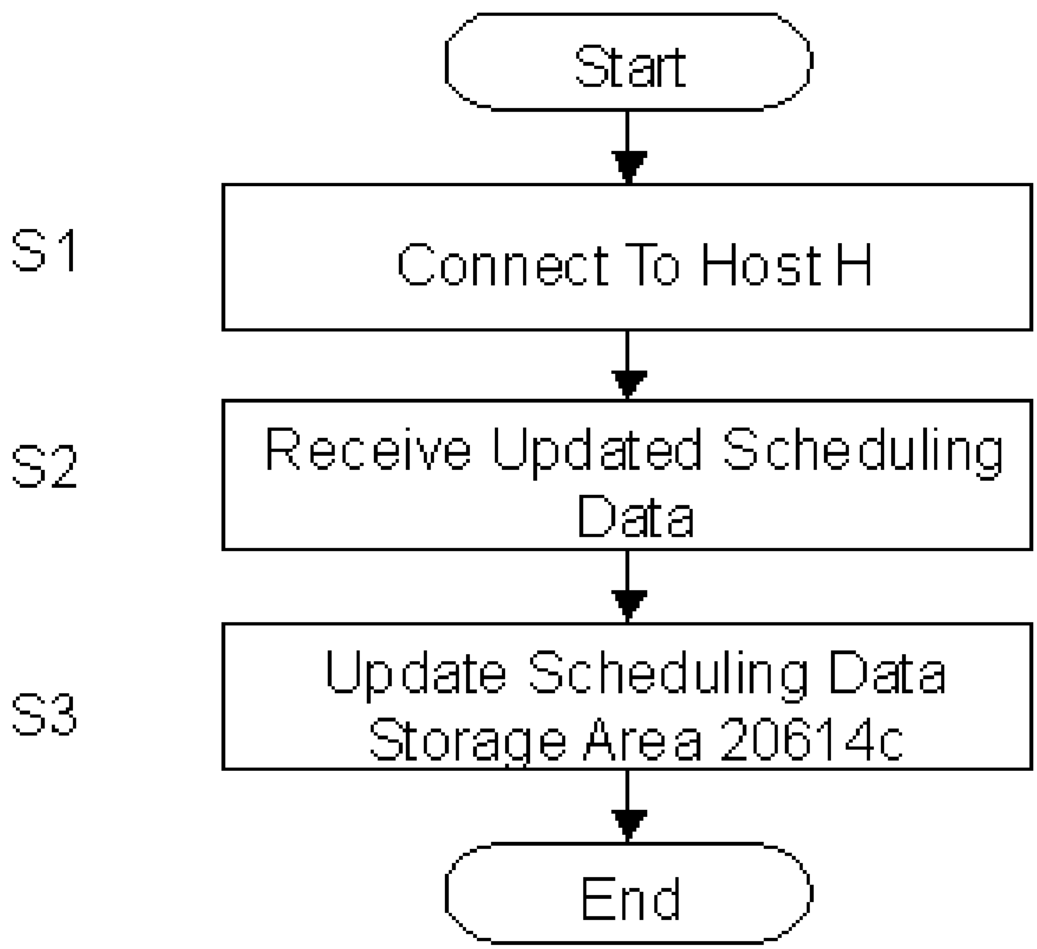

FIG. 348 is a flowchart illustrating an exemplary embodiment of the present invention.

Figure 349:
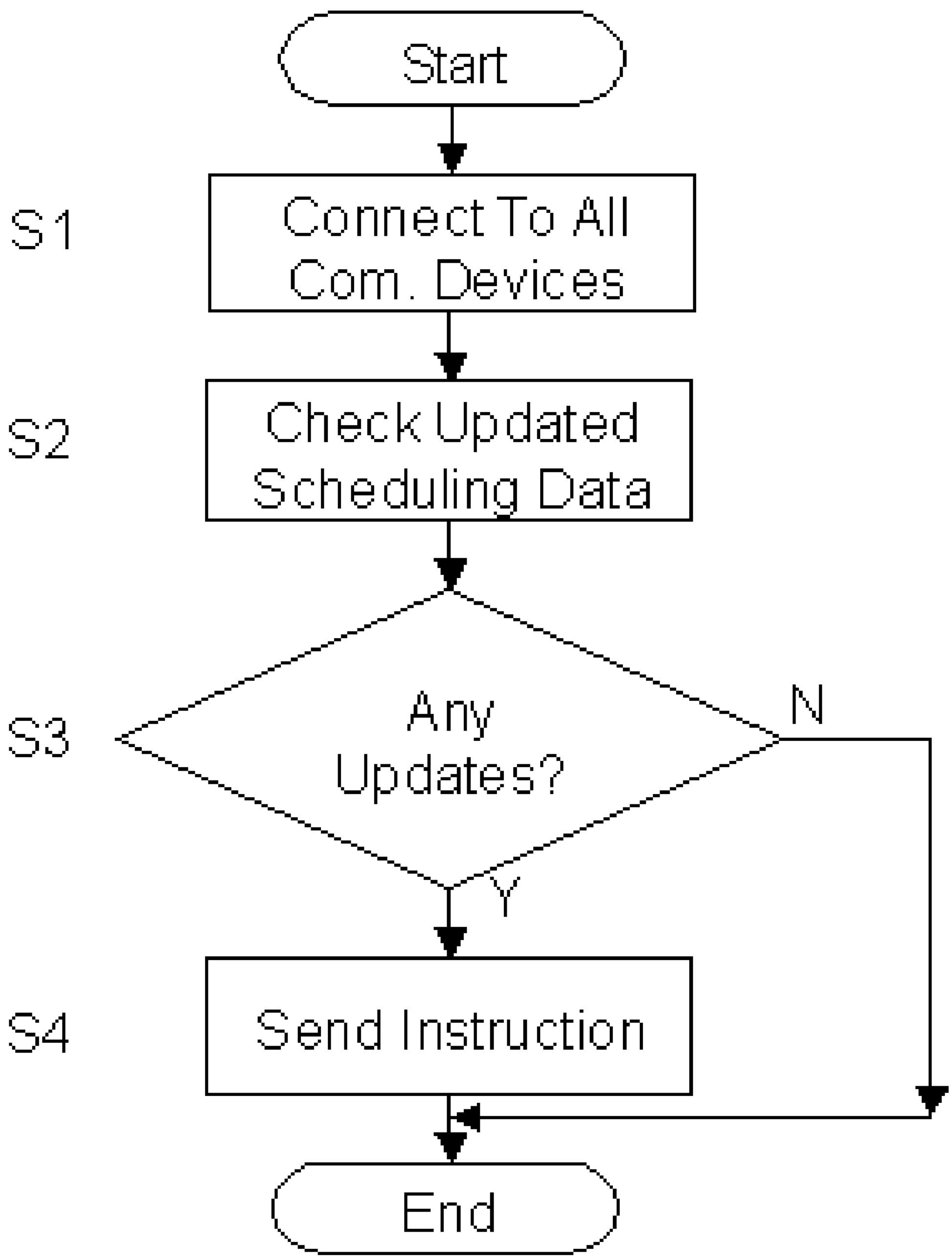

FIG. 349 is a flowchart illustrating an exemplary embodiment of the present invention.

Figure 350:
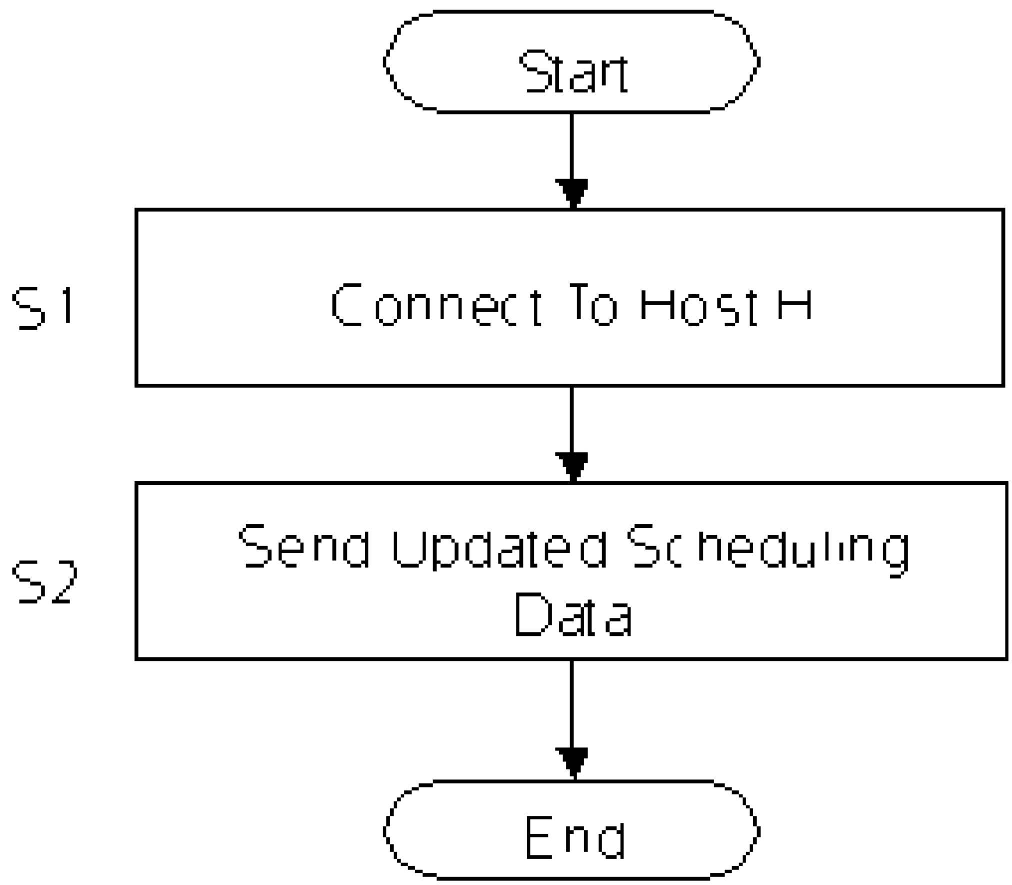

FIG. 350 is a flowchart illustrating an exemplary embodiment of the present invention.

Figure 351:
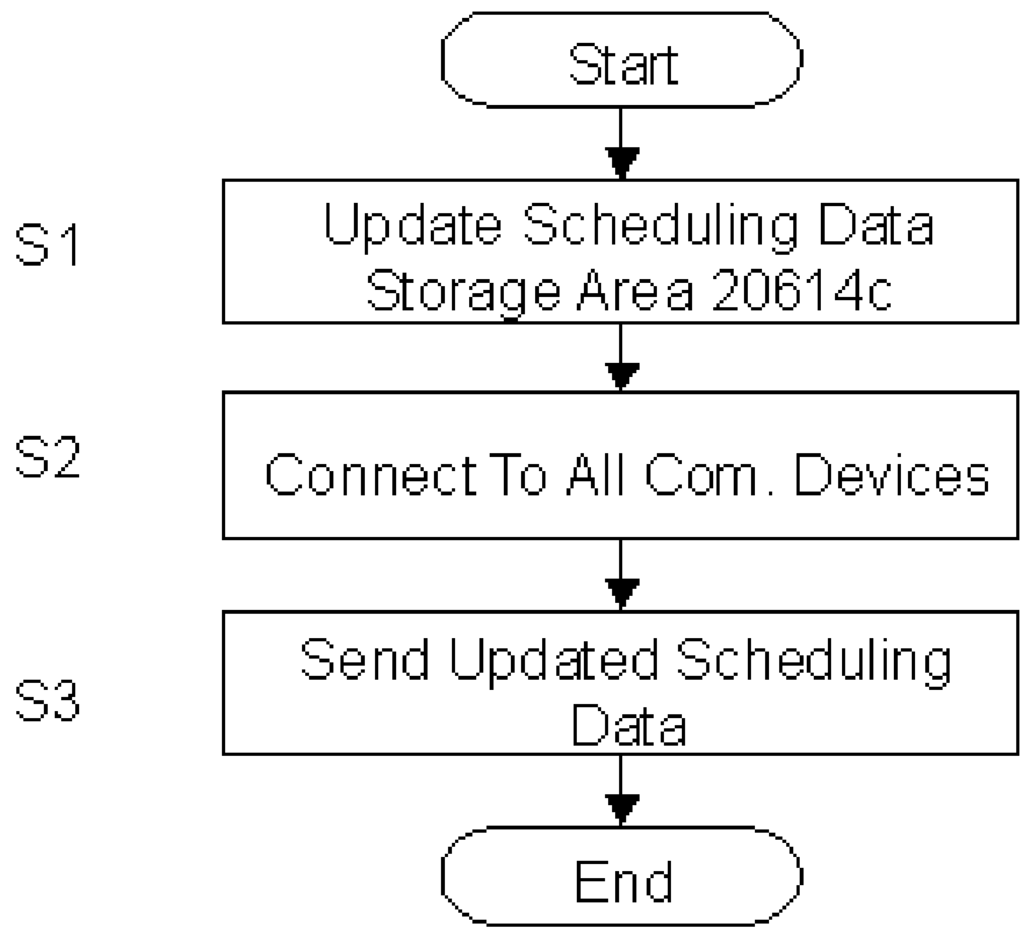

FIG. 351 is a flowchart illustrating an exemplary embodiment of the present invention.

Figure 352:
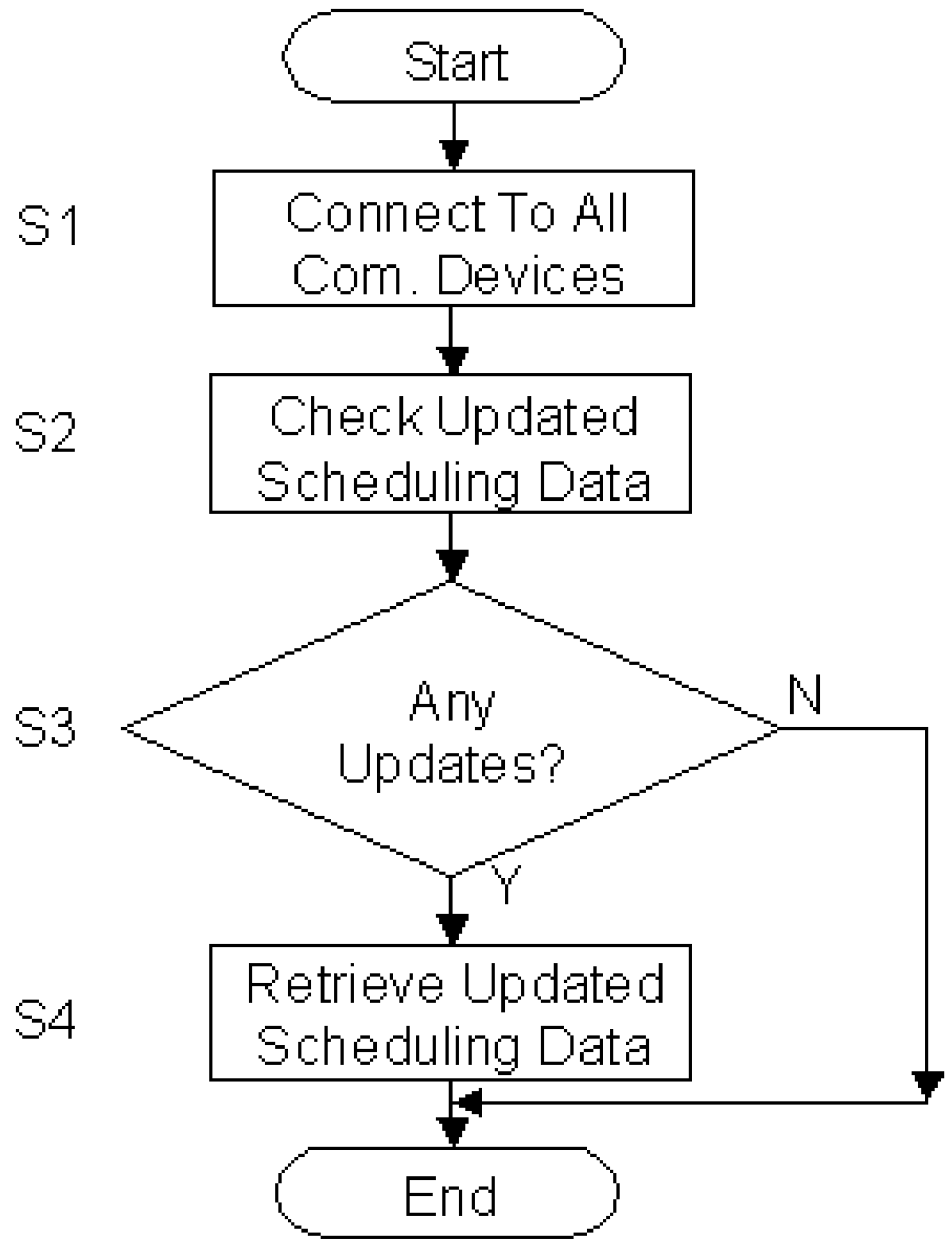

FIG. 352 is a flowchart illustrating an exemplary embodiment of the present invention.

Figure 353:
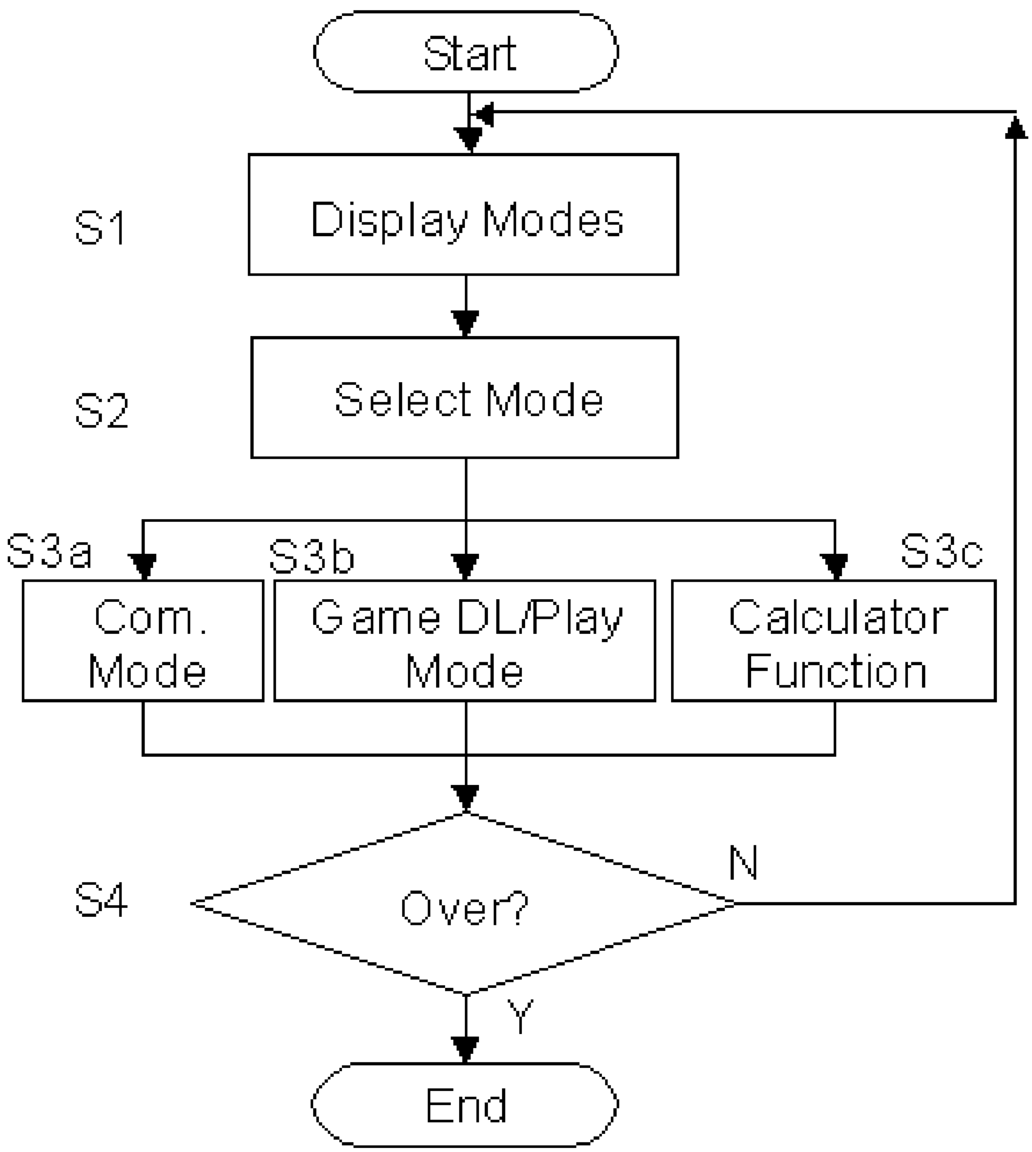

FIG. 353 is a flowchart illustrating an exemplary embodiment of the present invention.

Figure 354:
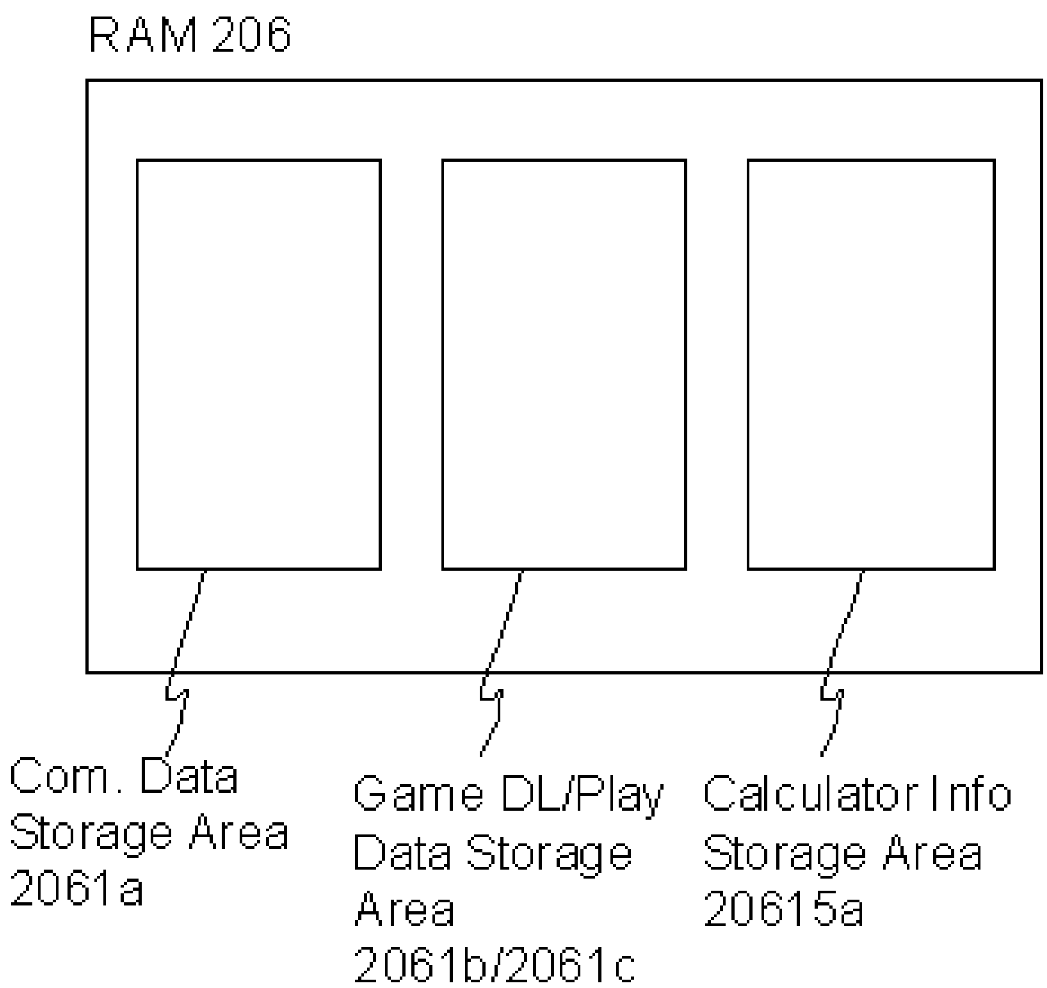

FIG. 354 is a block diagram illustrating an exemplary embodiment of the present invention.

Figure 355:
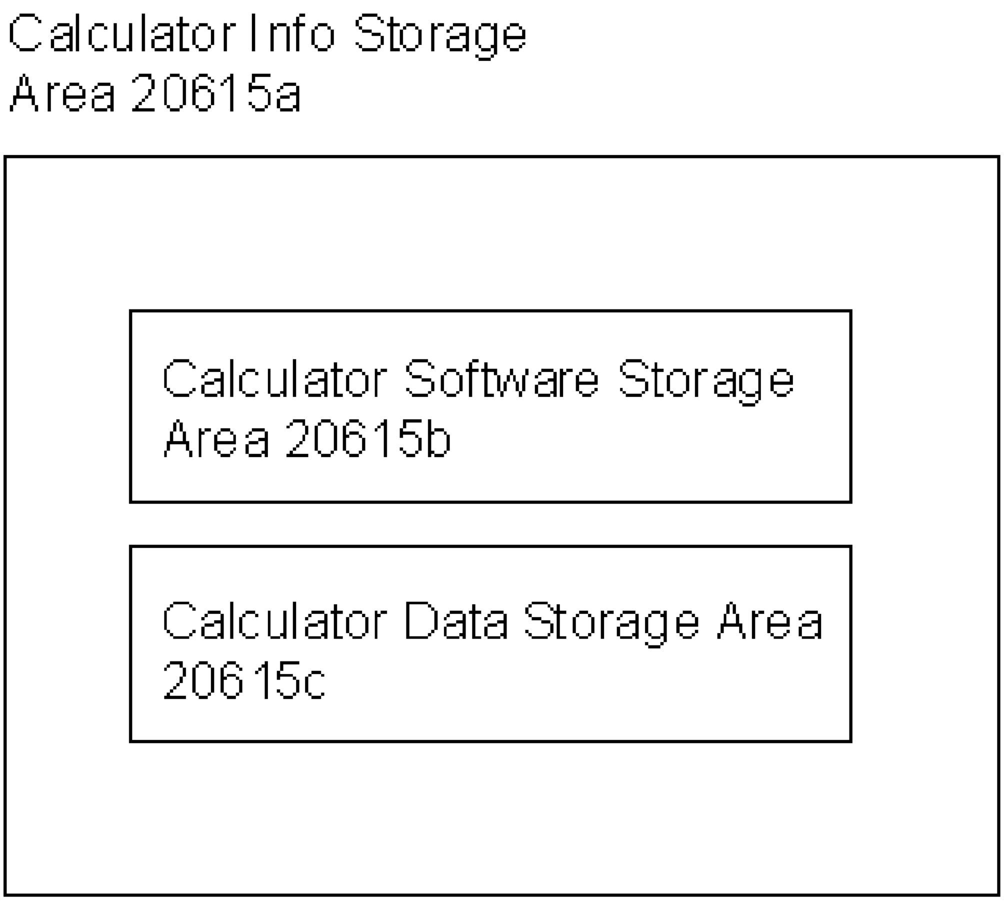

FIG. 355 is a block diagram illustrating an exemplary embodiment of the present invention.

Figure 356:
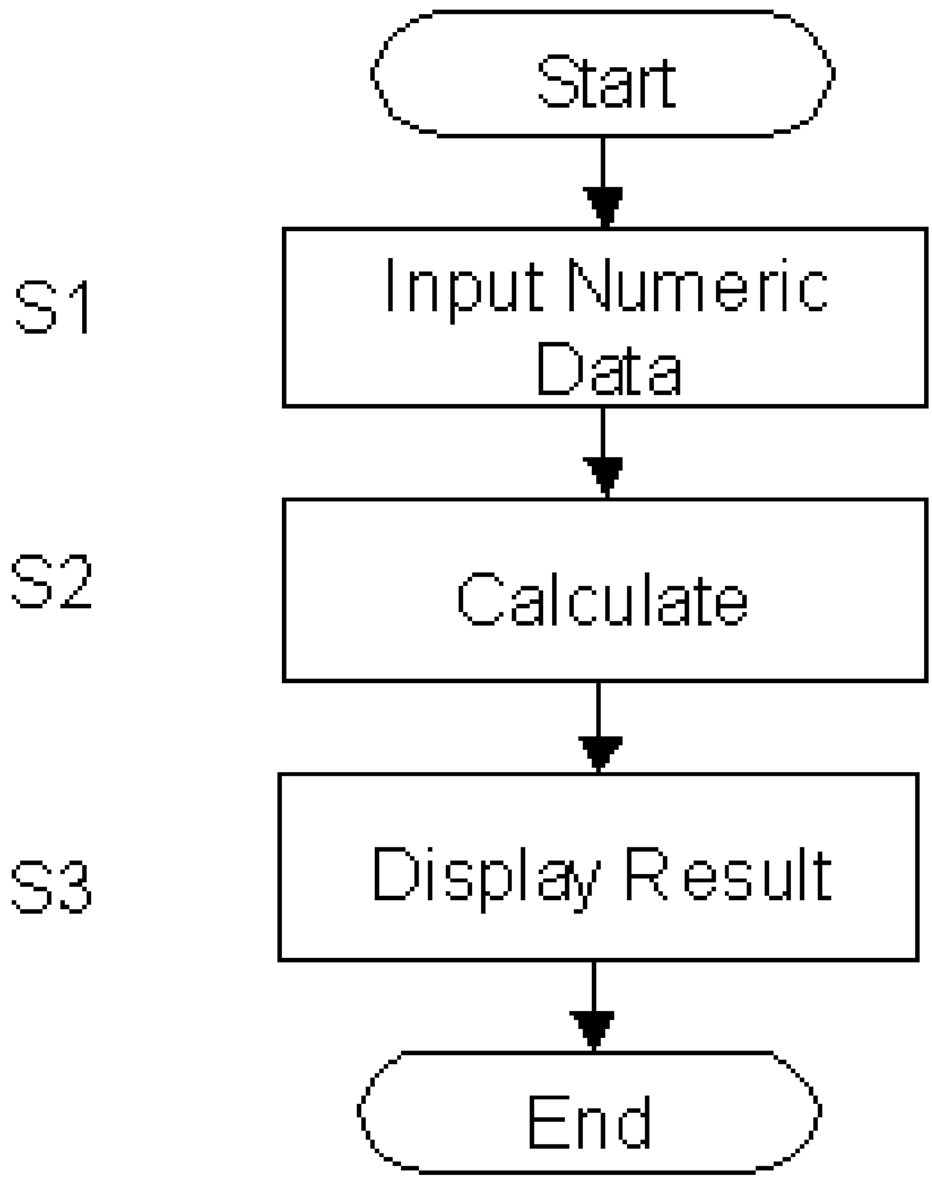

FIG. 356 is a flowchart illustrating an exemplary embodiment of the present invention.

Figure 357:
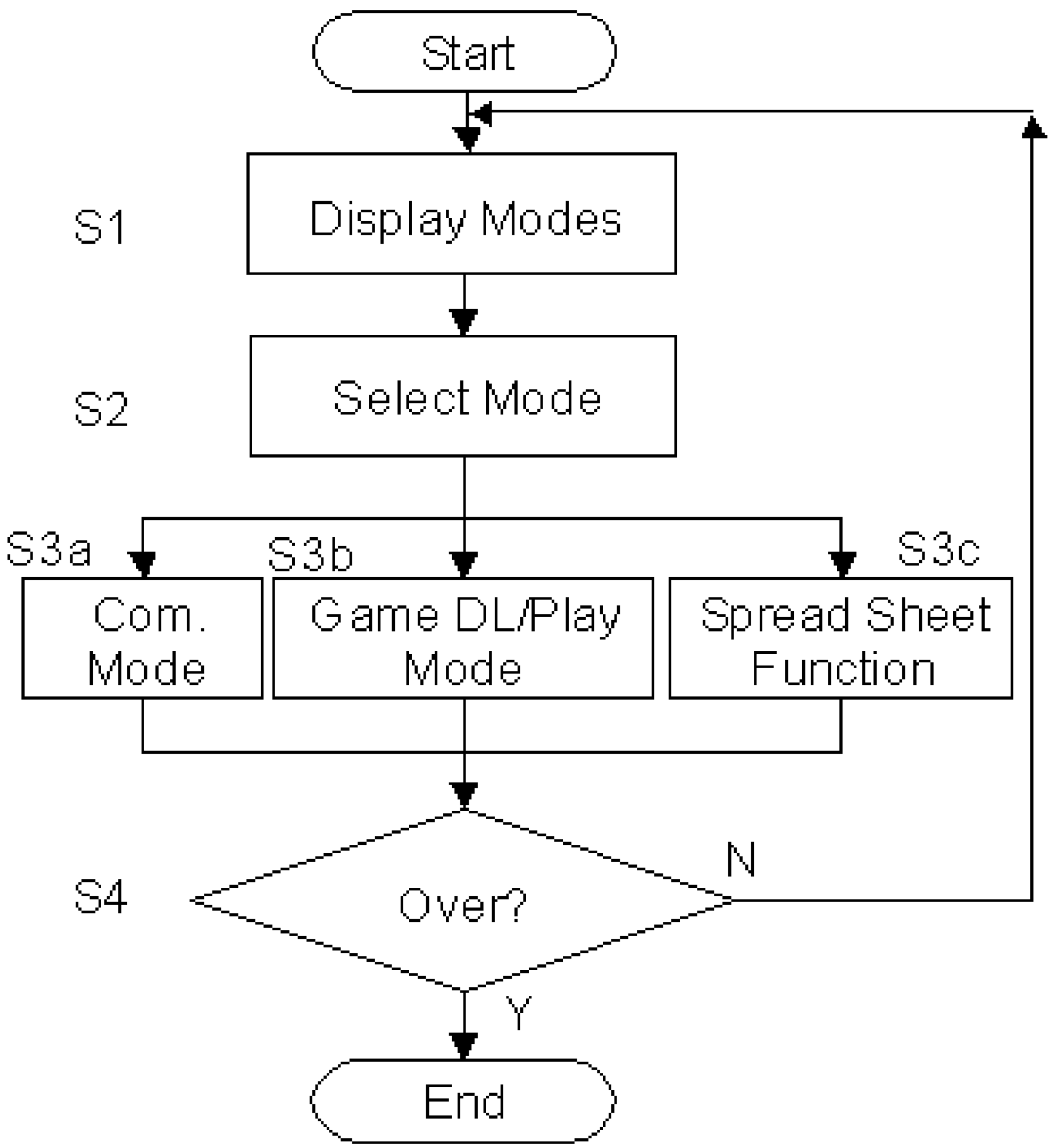

FIG. 357 is a flowchart illustrating an exemplary embodiment of the present invention.

Figure 358:
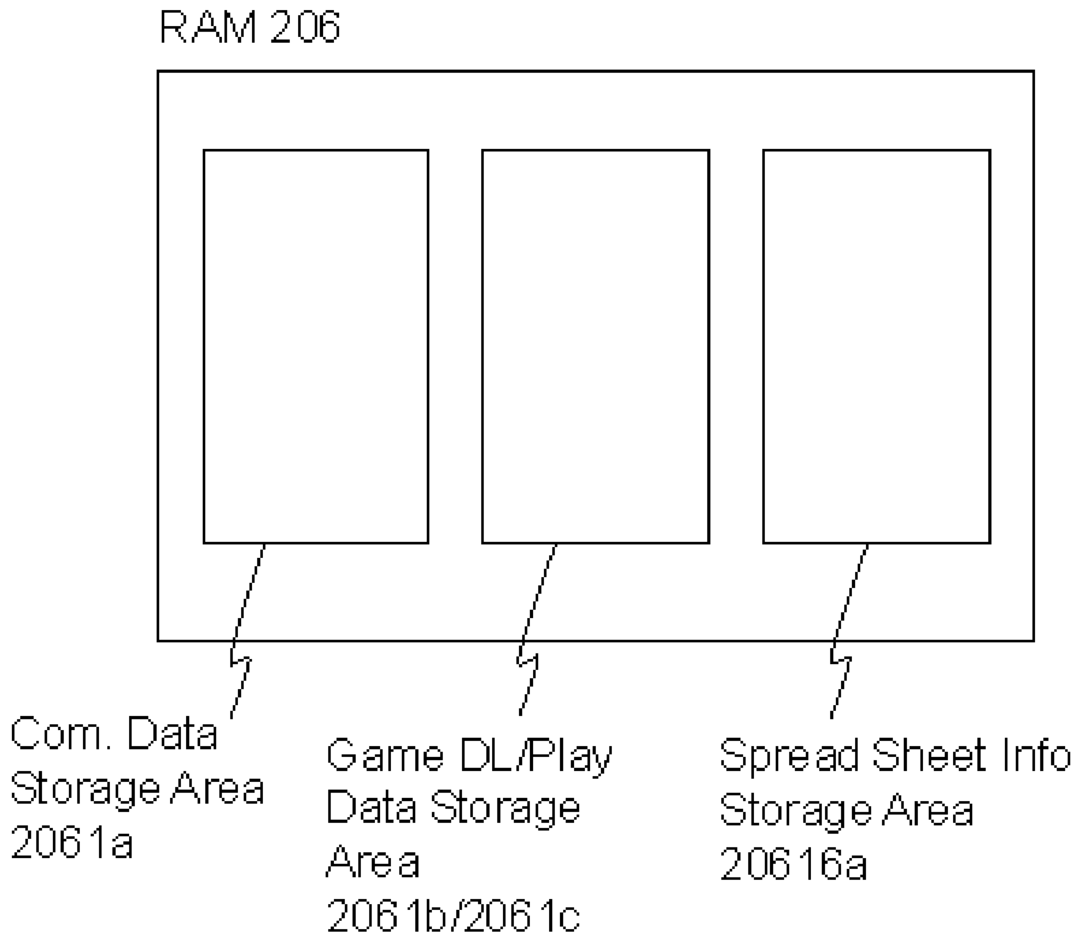

FIG. 358 is a block diagram illustrating an exemplary embodiment of the present invention.

Figure 359:
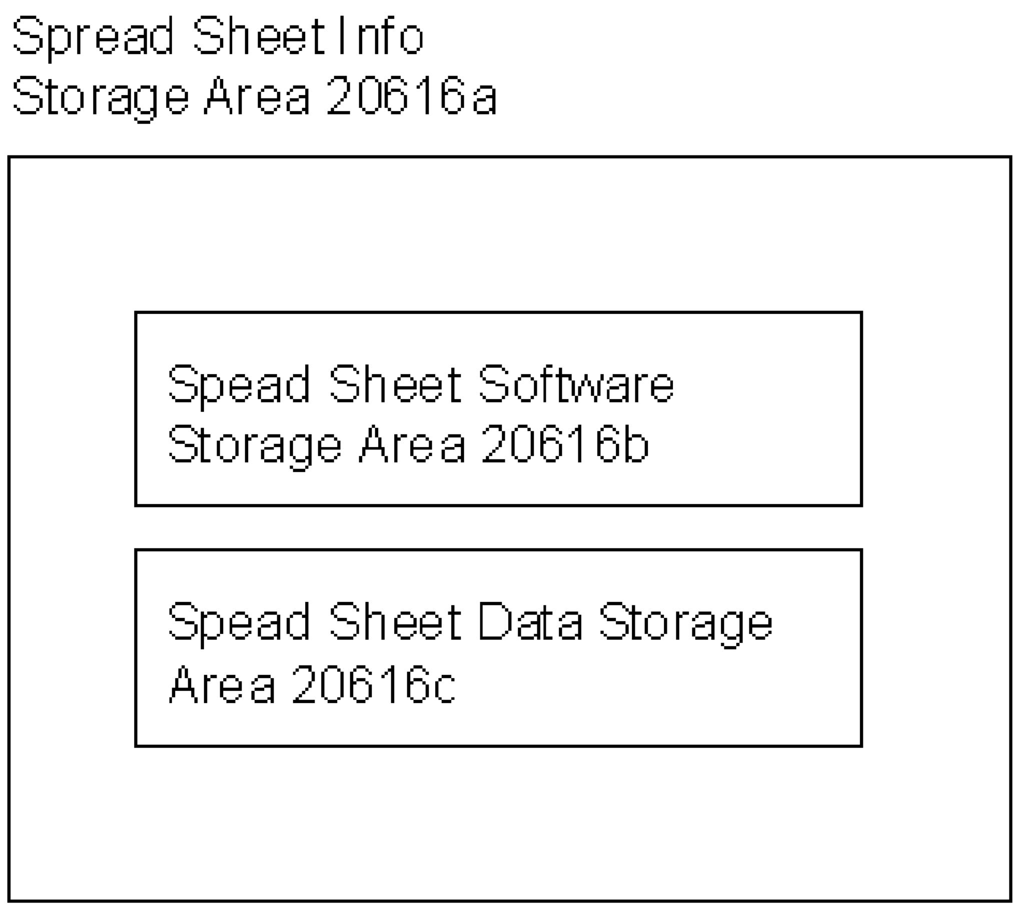

FIG. 359 is a block diagram illustrating an exemplary embodiment of the present invention.

Figure 360:
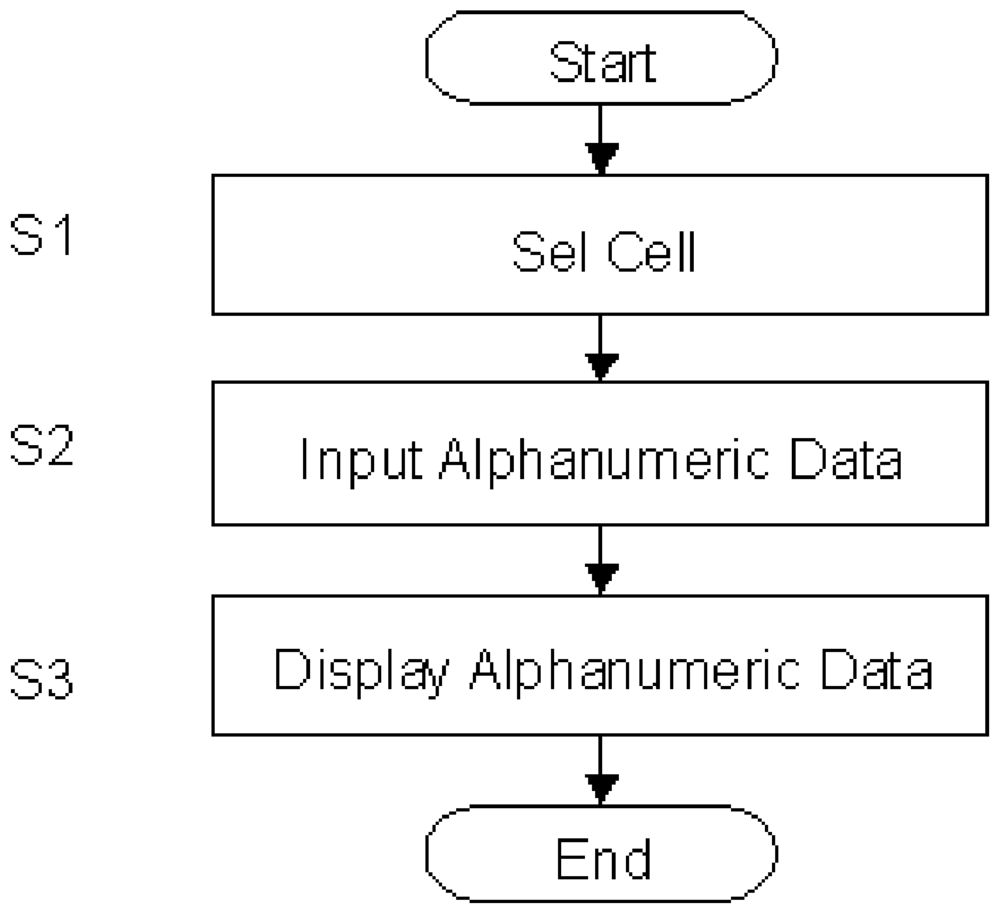

FIG. 360 is a flowchart illustrating an exemplary embodiment of the present invention.

Figure 361:
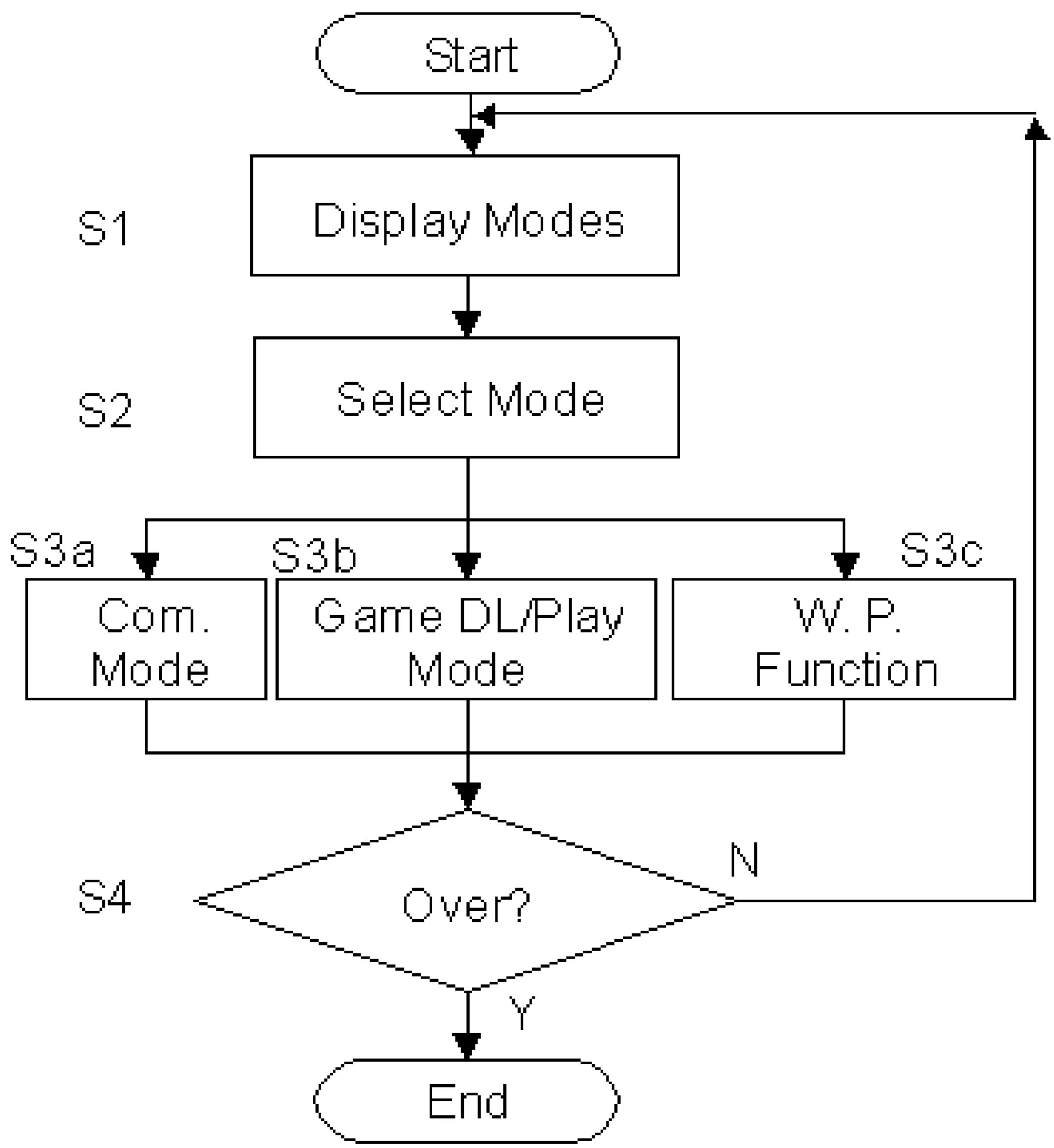

FIG. 361 is a flowchart illustrating an exemplary embodiment of the present invention.

Figure 362:
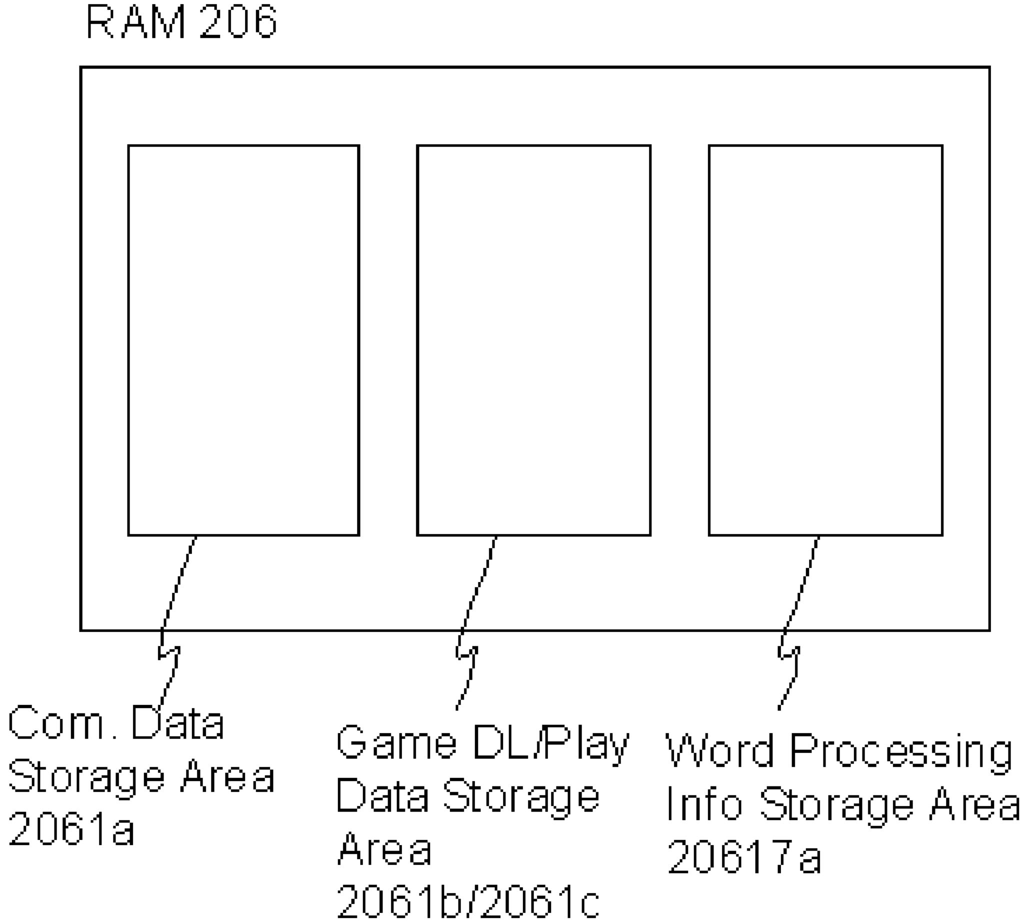

FIG. 362 is a block diagram illustrating an exemplary embodiment of the present invention.

Figure 363:
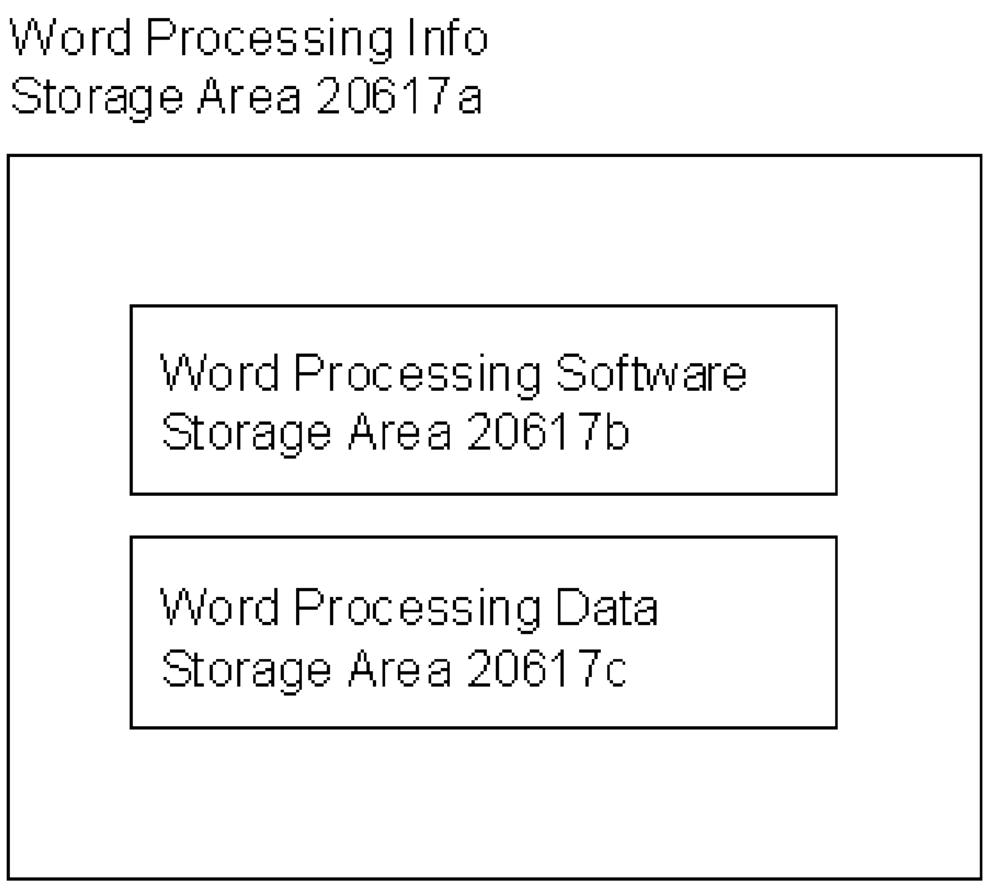

FIG. 363 is a block diagram illustrating an exemplary embodiment of the present invention.

Figure 364:
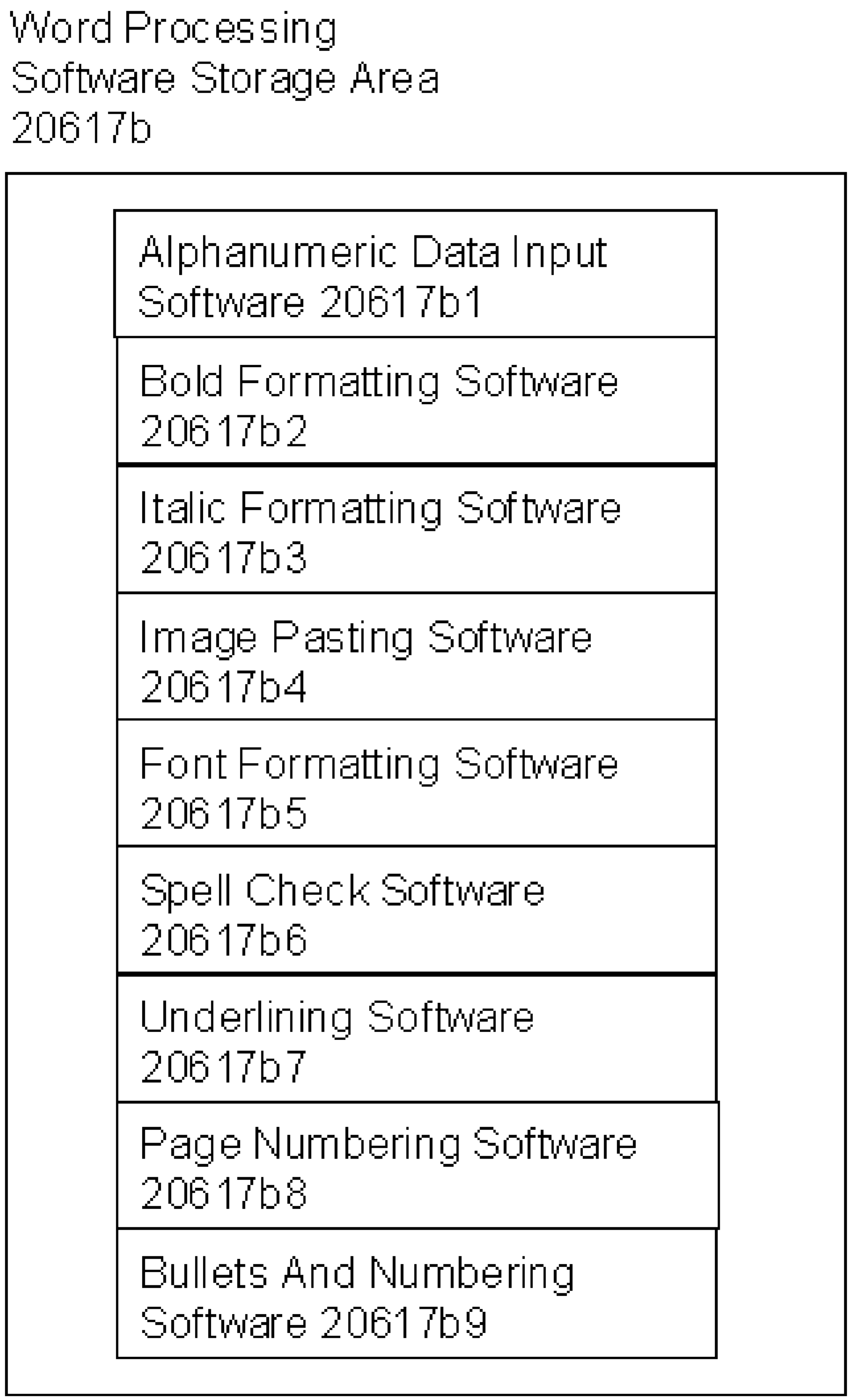

FIG. 364 is a block diagram illustrating an exemplary embodiment of the present invention.

Figure 365:
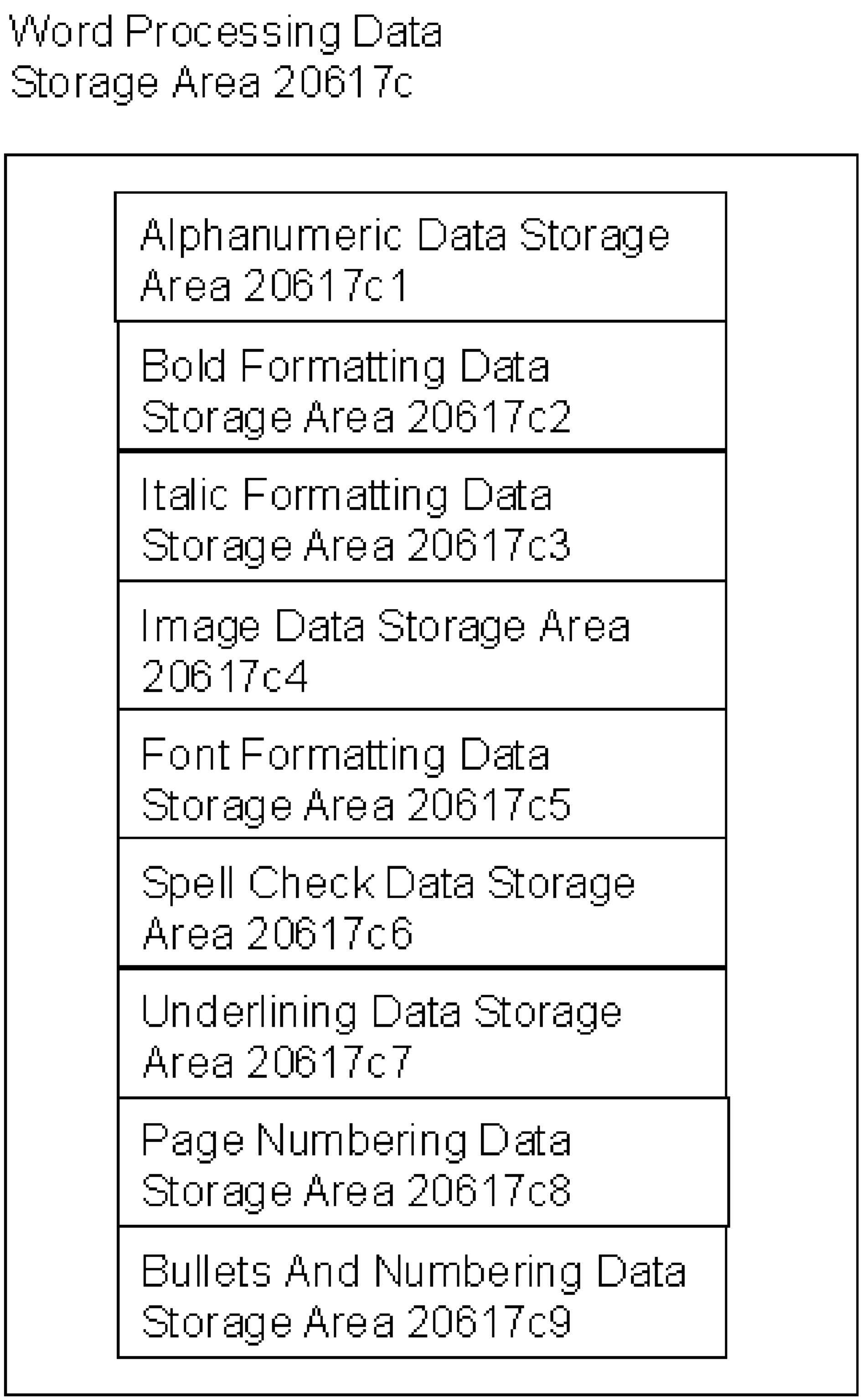

FIG. 365 is a block diagram illustrating an exemplary embodiment of the present invention.

Figure 365A:
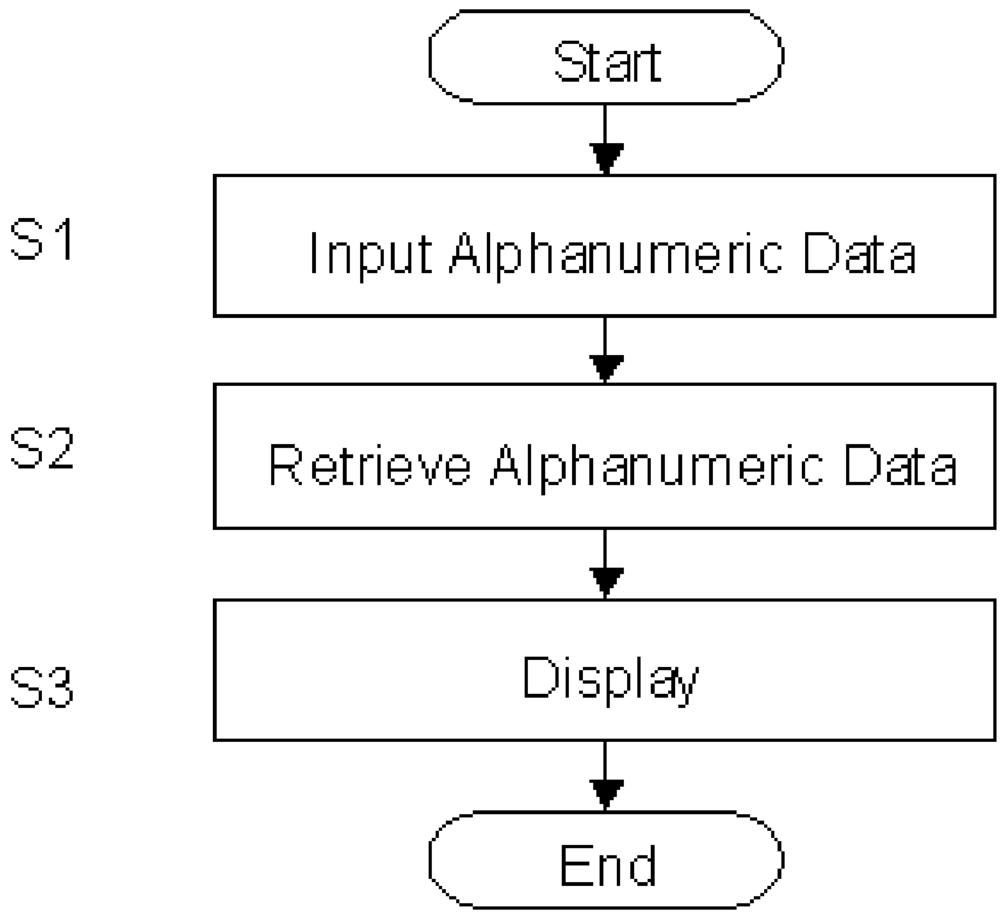

FIG. 365*a* is a flowchart illustrating an exemplary embodiment of the present invention.

Figure 366:
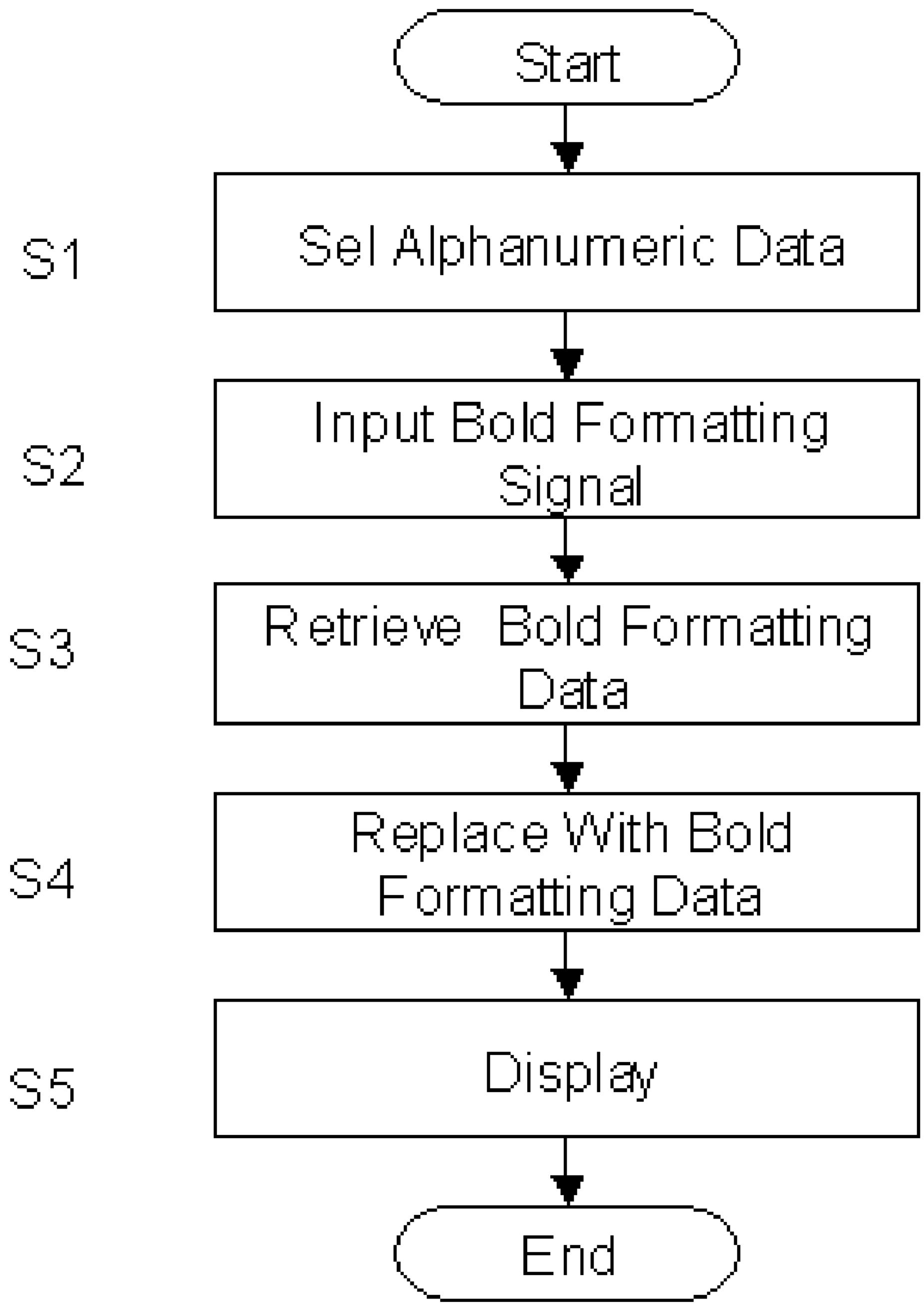

FIG. 366 is a flowchart illustrating an exemplary embodiment of the present invention.

Figure 367:
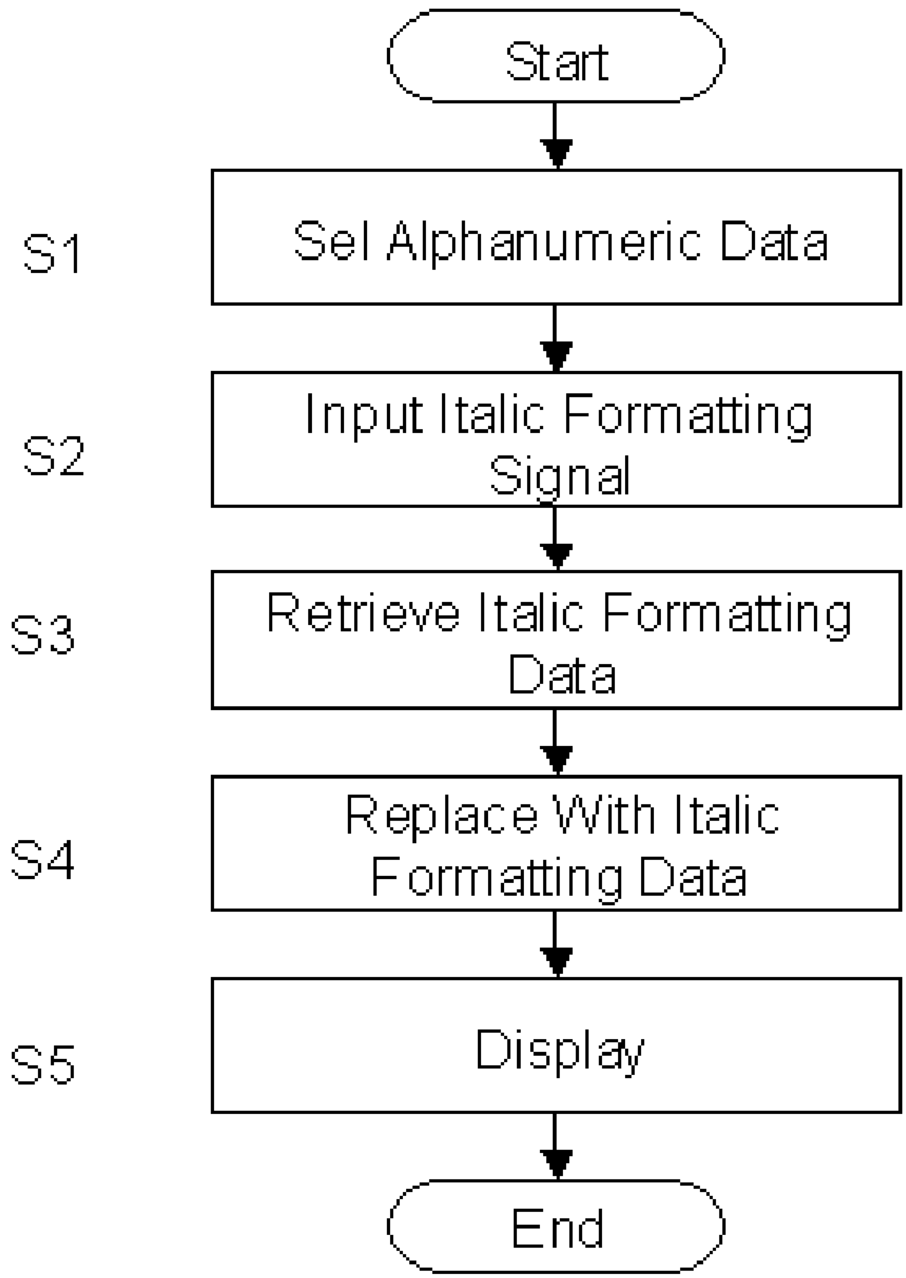

FIG. 367 is a flowchart illustrating an exemplary embodiment of the present invention.

Figure 368:
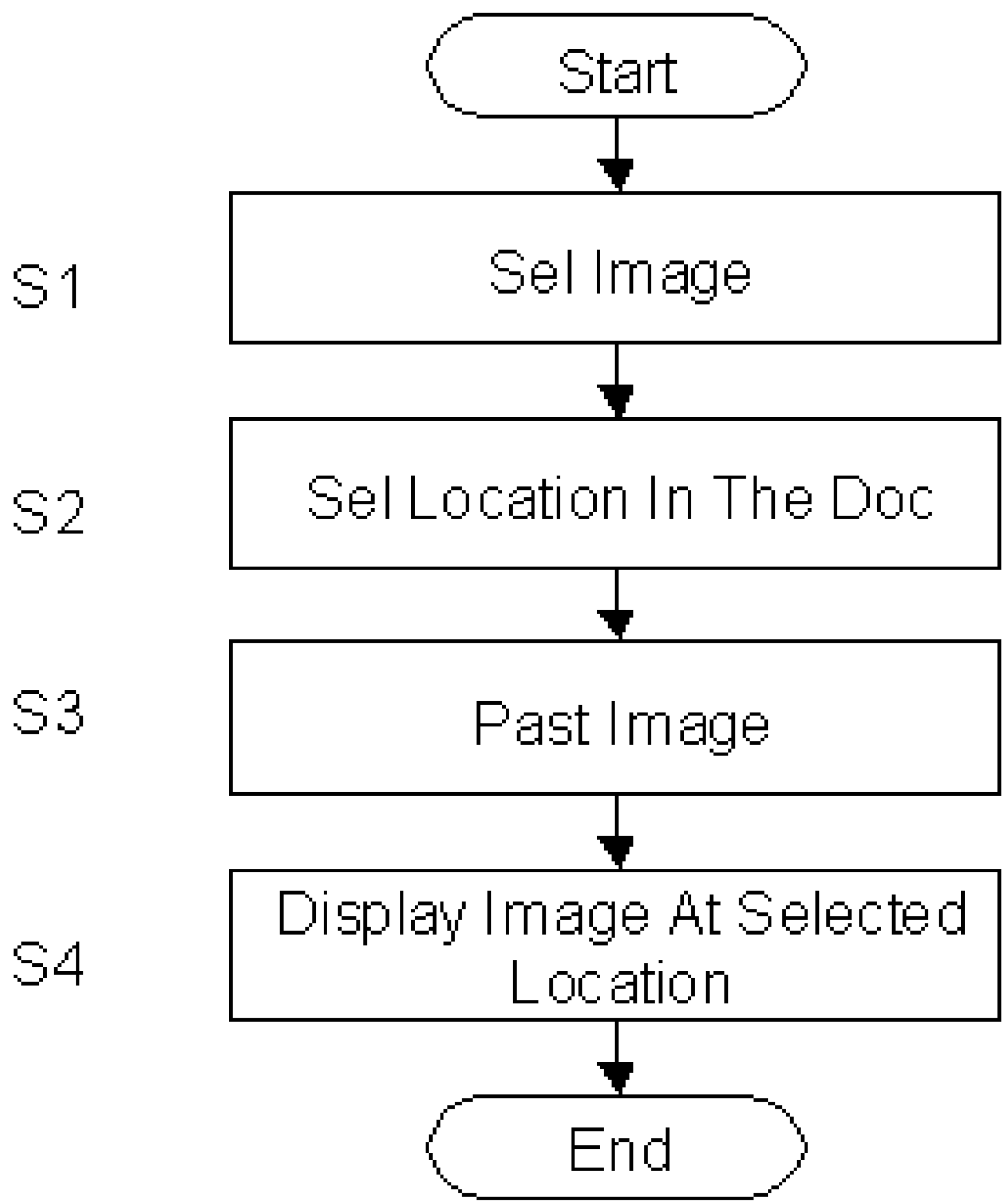

FIG. 368 is a flowchart illustrating an exemplary embodiment of the present invention.

Figure 369:
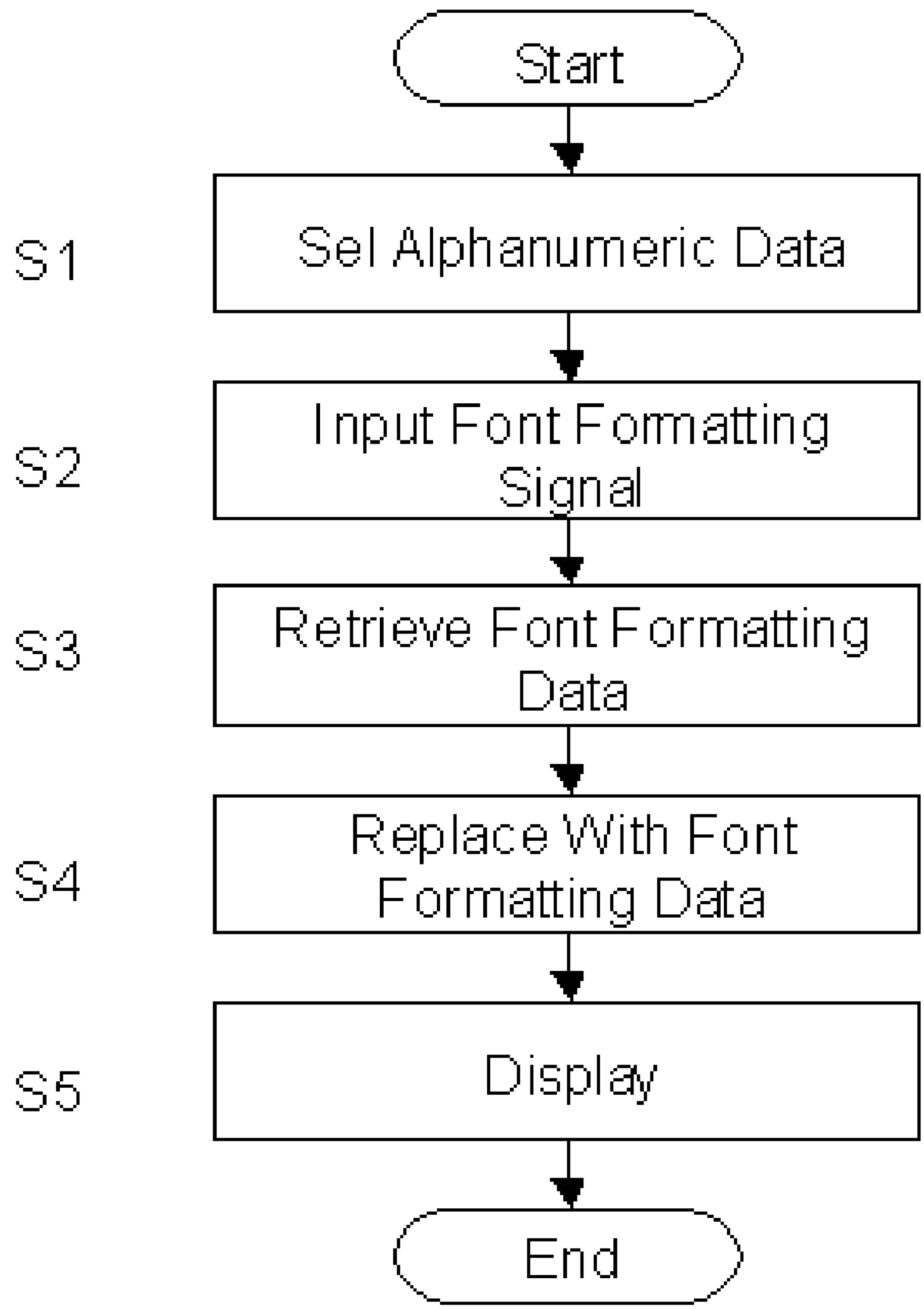

FIG. 369 is a flowchart illustrating an exemplary embodiment of the present invention.

Figure 370:
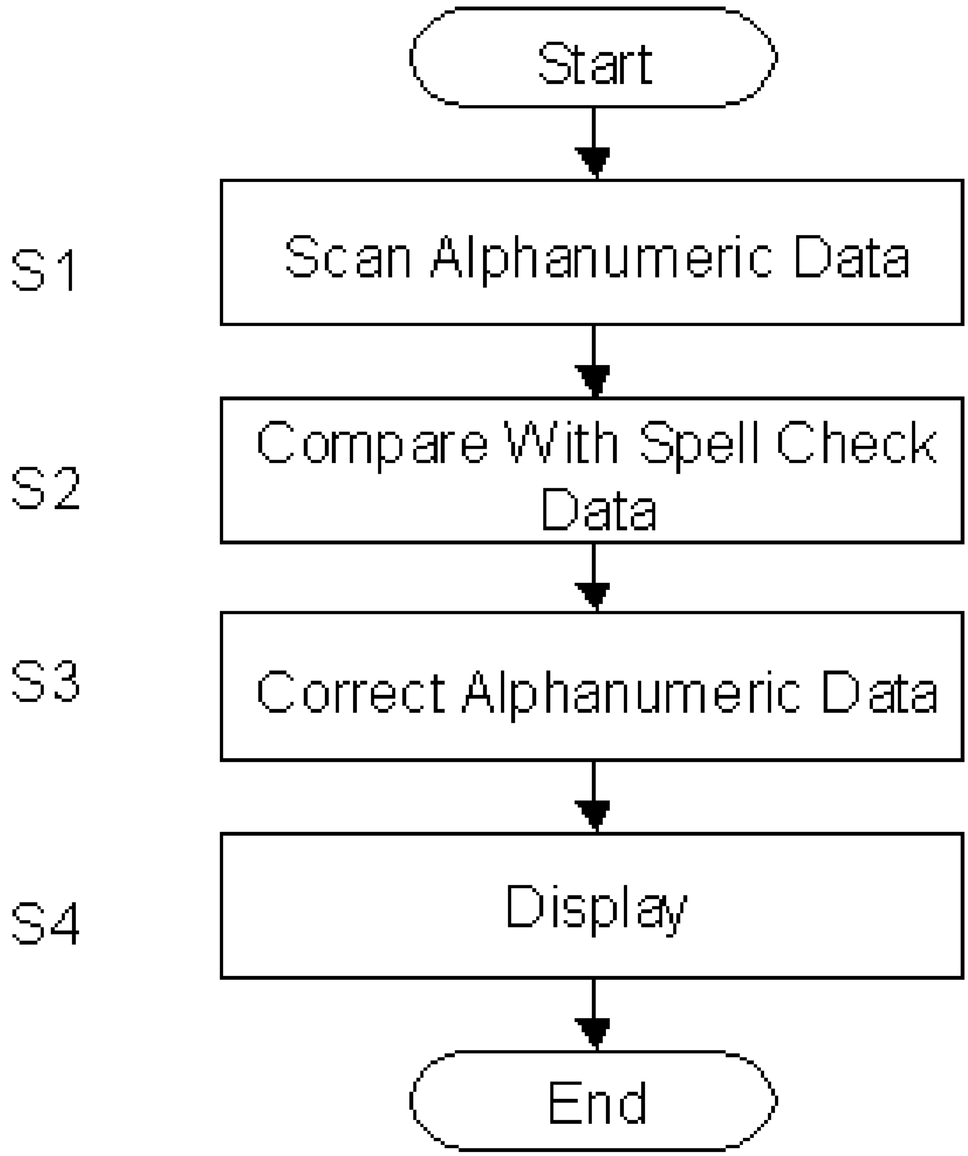

FIG. 370 is a flowchart illustrating an exemplary embodiment of the present invention.

Figure 371:
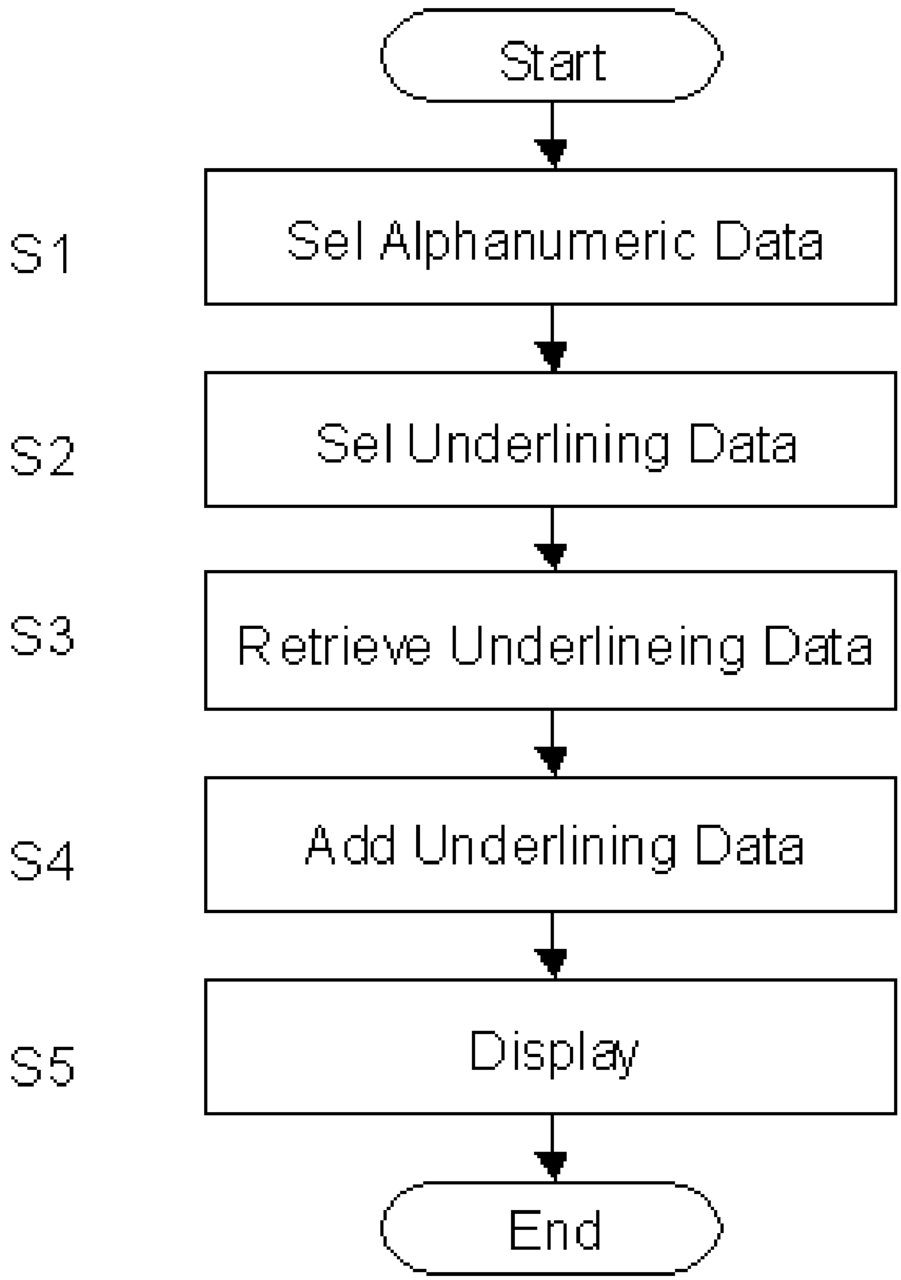

FIG. 371 is a flowchart illustrating an exemplary embodiment of the present invention.

Figure 372:
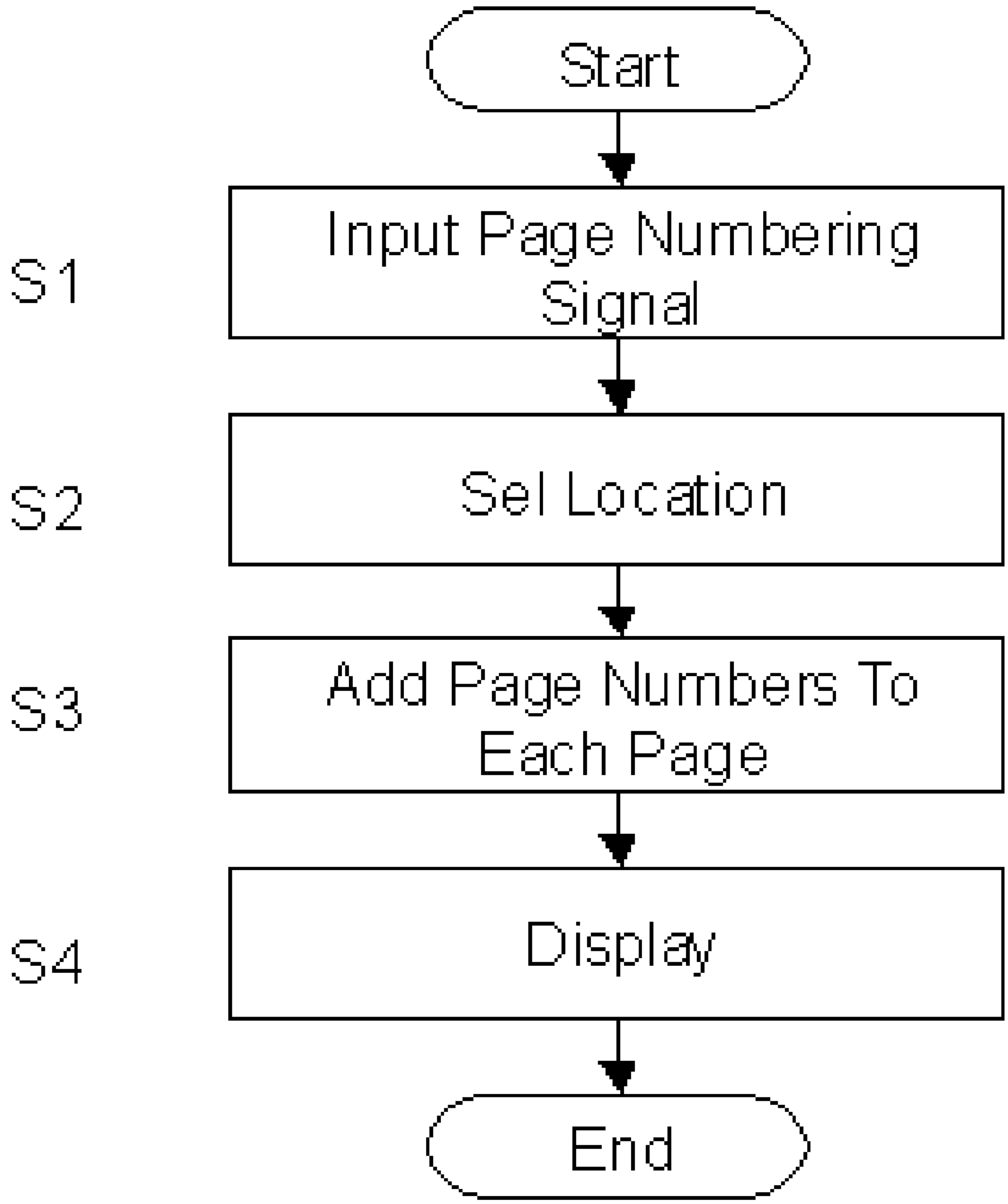

FIG. 372 is a flowchart illustrating an exemplary embodiment of the present invention.

Figure 373:
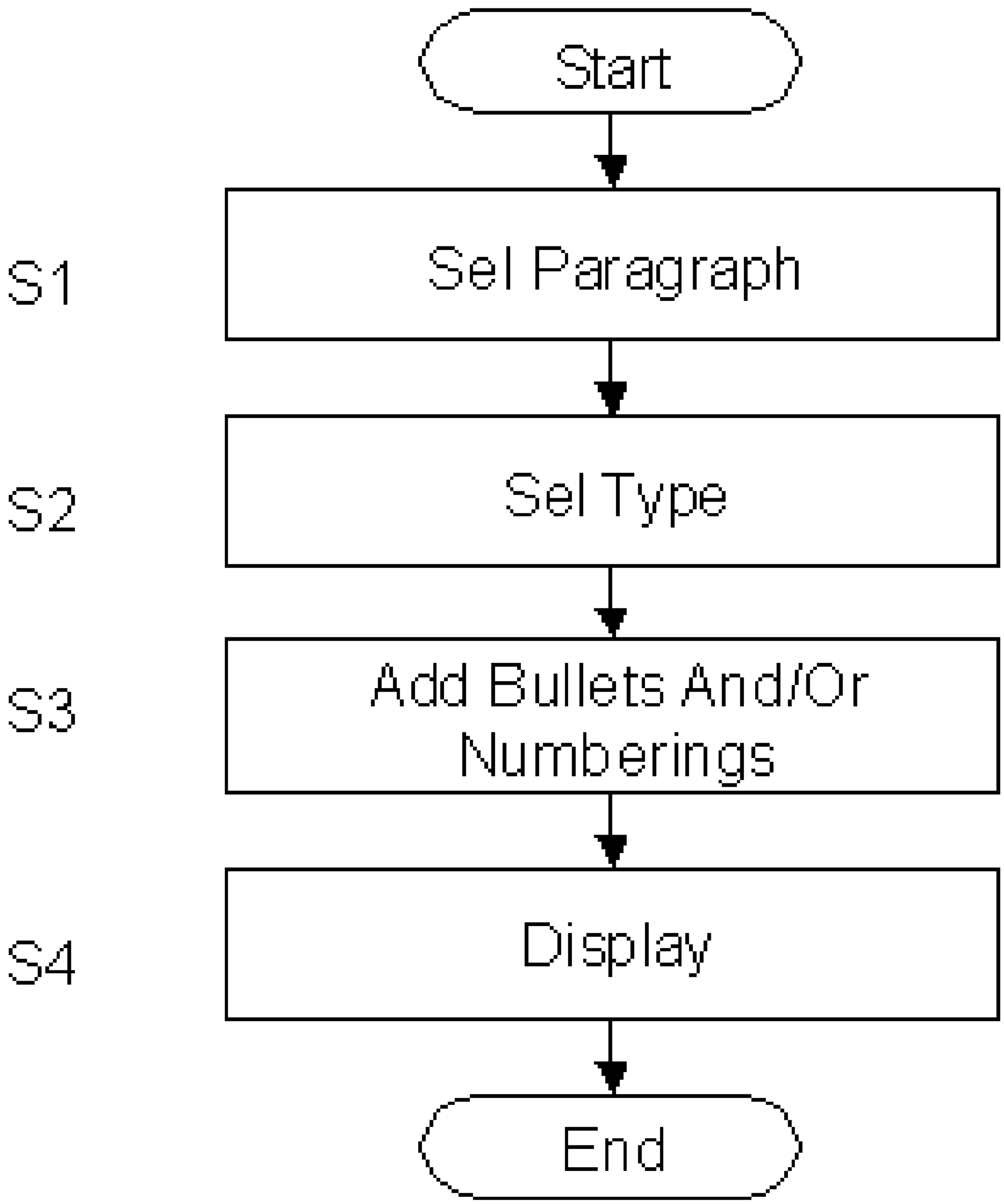

FIG. 373 is a flowchart illustrating an exemplary embodiment of the present invention.

Figure 374:
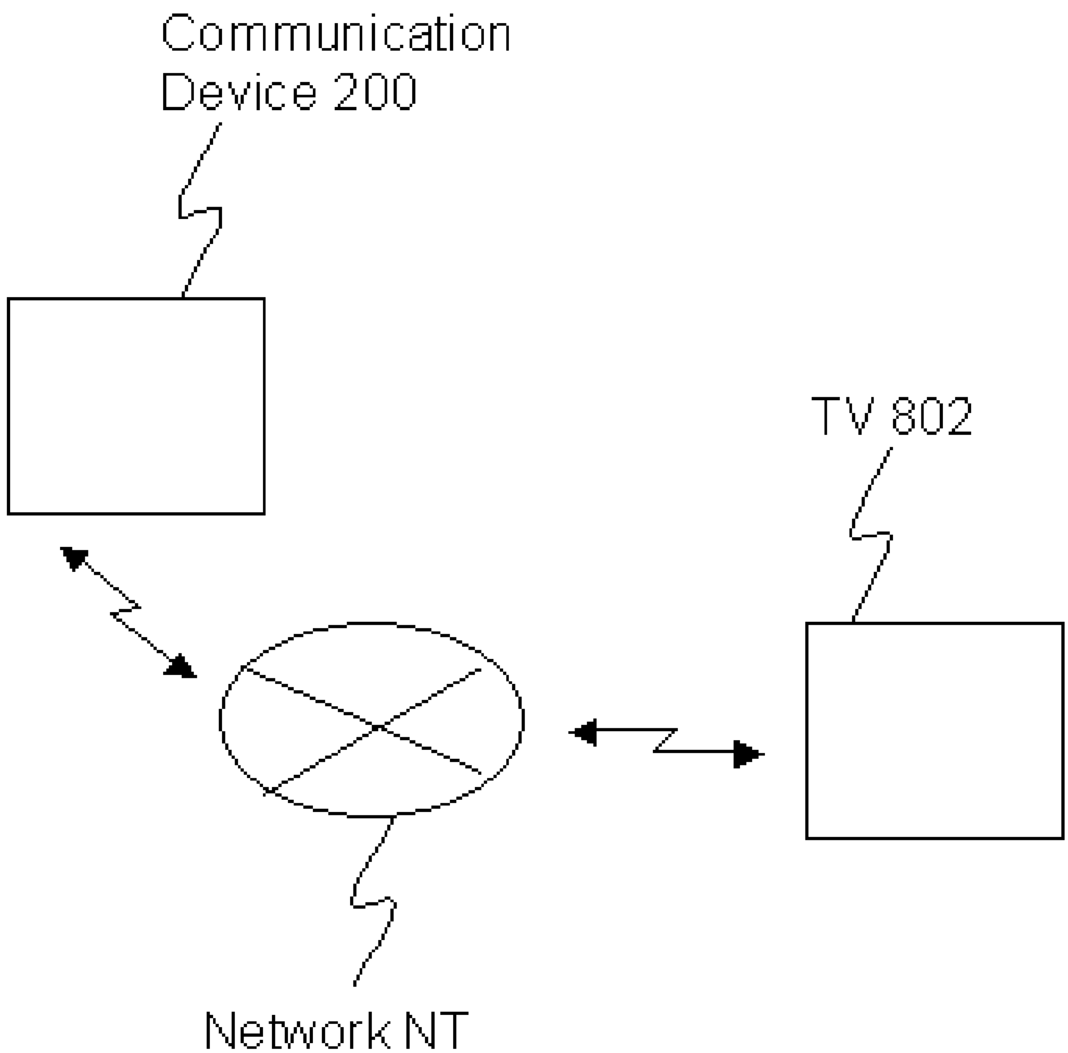

FIG. 374 is a simplified illustration illustrating an exemplary embodiment of the present invention.

Figure 375:
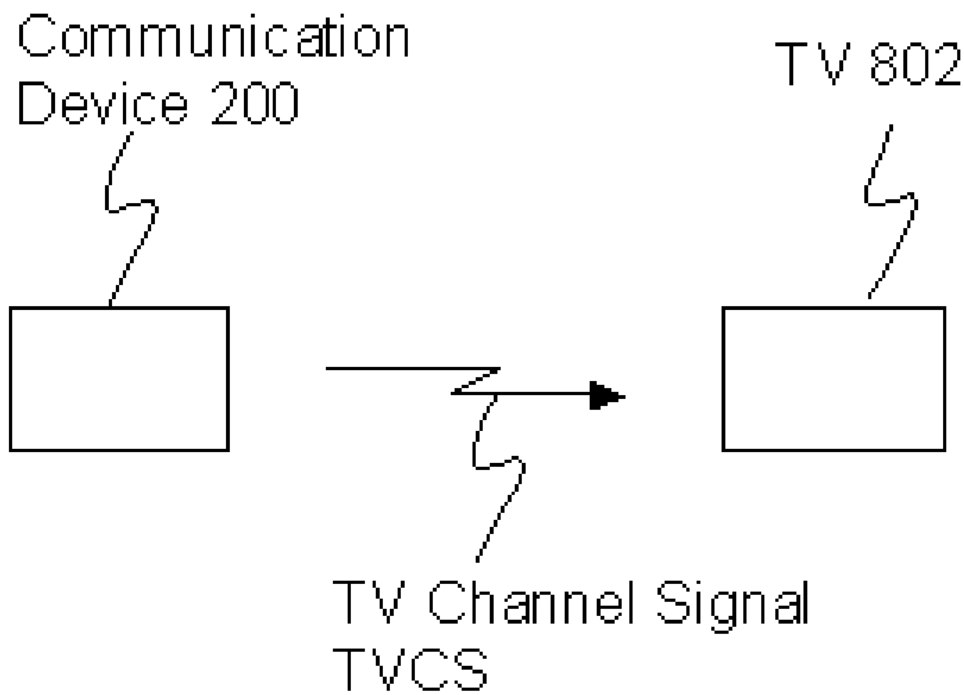

FIG. 375 is a simplified illustration illustrating an exemplary embodiment of the present invention.

Figure 376:
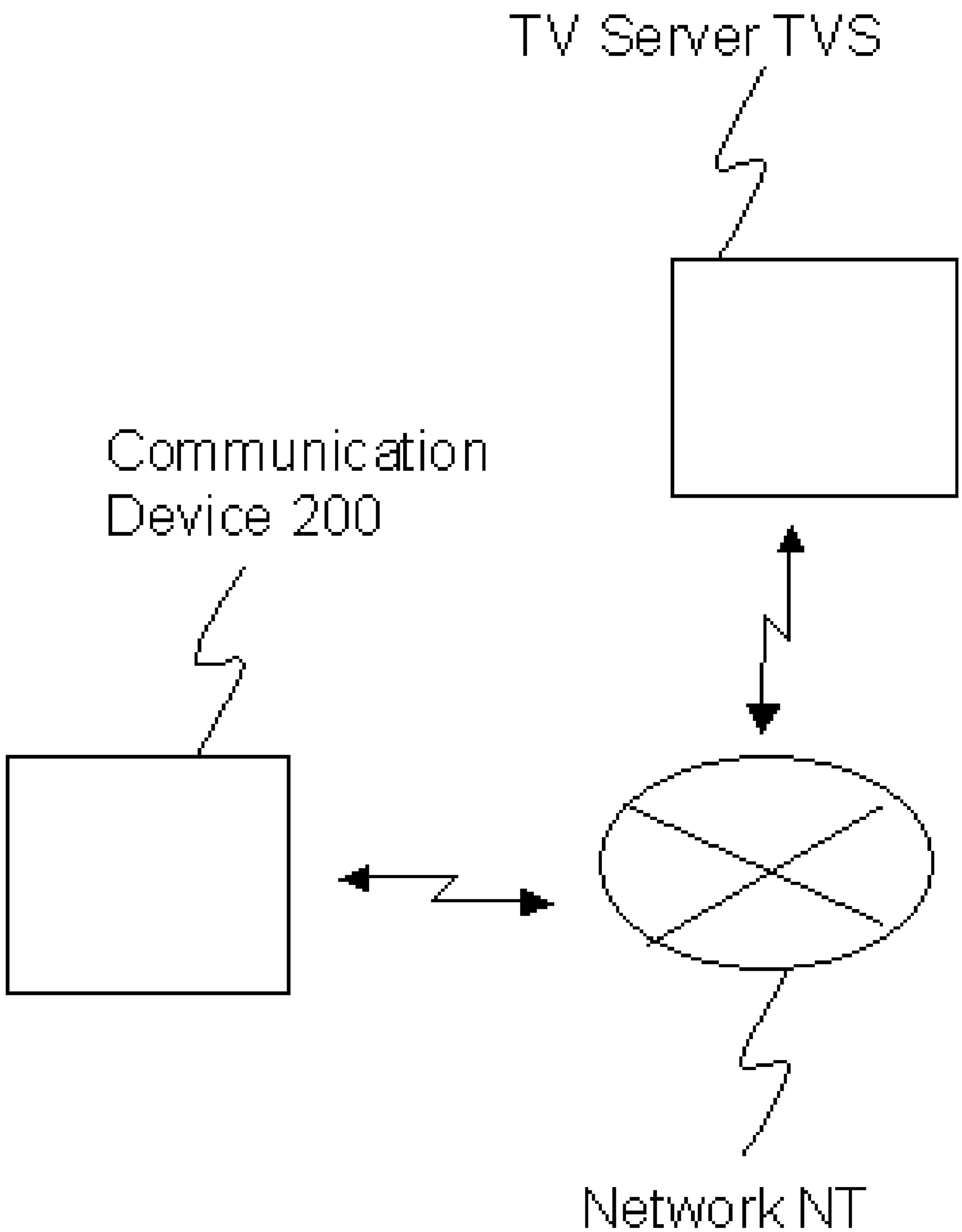

FIG. 376 is a simplified illustration illustrating an exemplary embodiment of the present invention.

Figure 377:
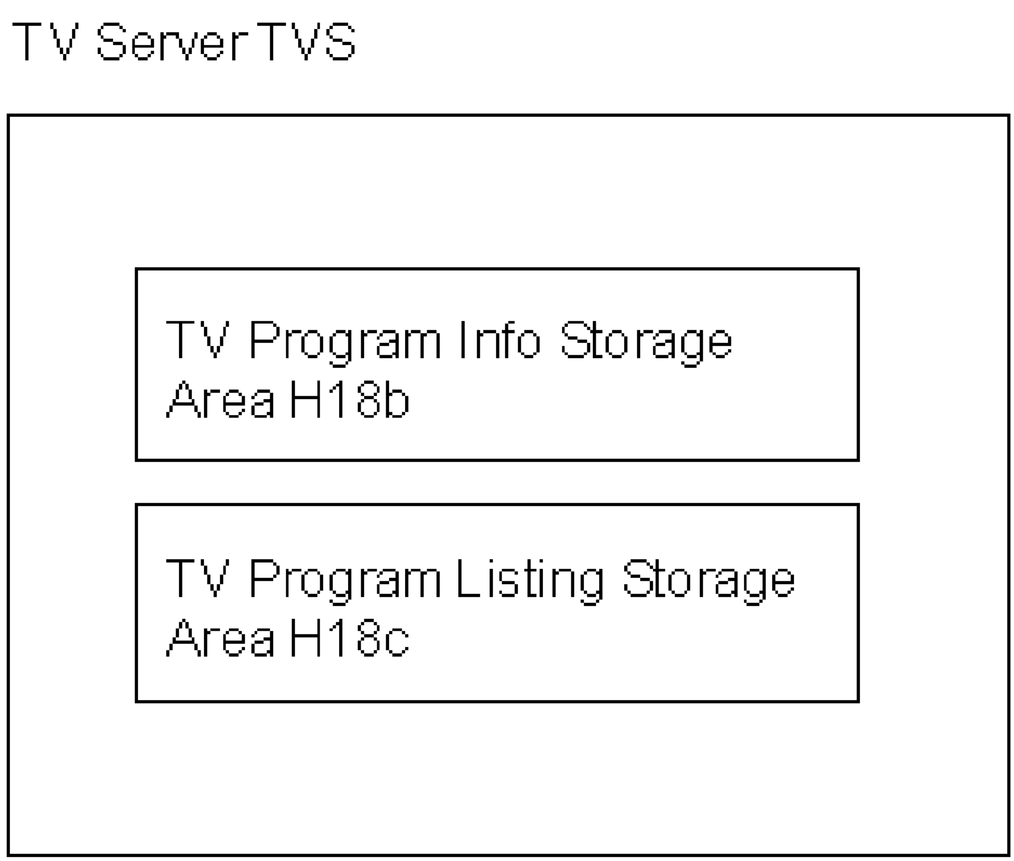

FIG. 377 is a block diagram illustrating an exemplary embodiment of the present invention.

FIG. 378 is a block diagram illustrating an exemplary embodiment of the present invention.

FIG. 379 is a block diagram illustrating an exemplary embodiment of the present invention.

Figure 380:
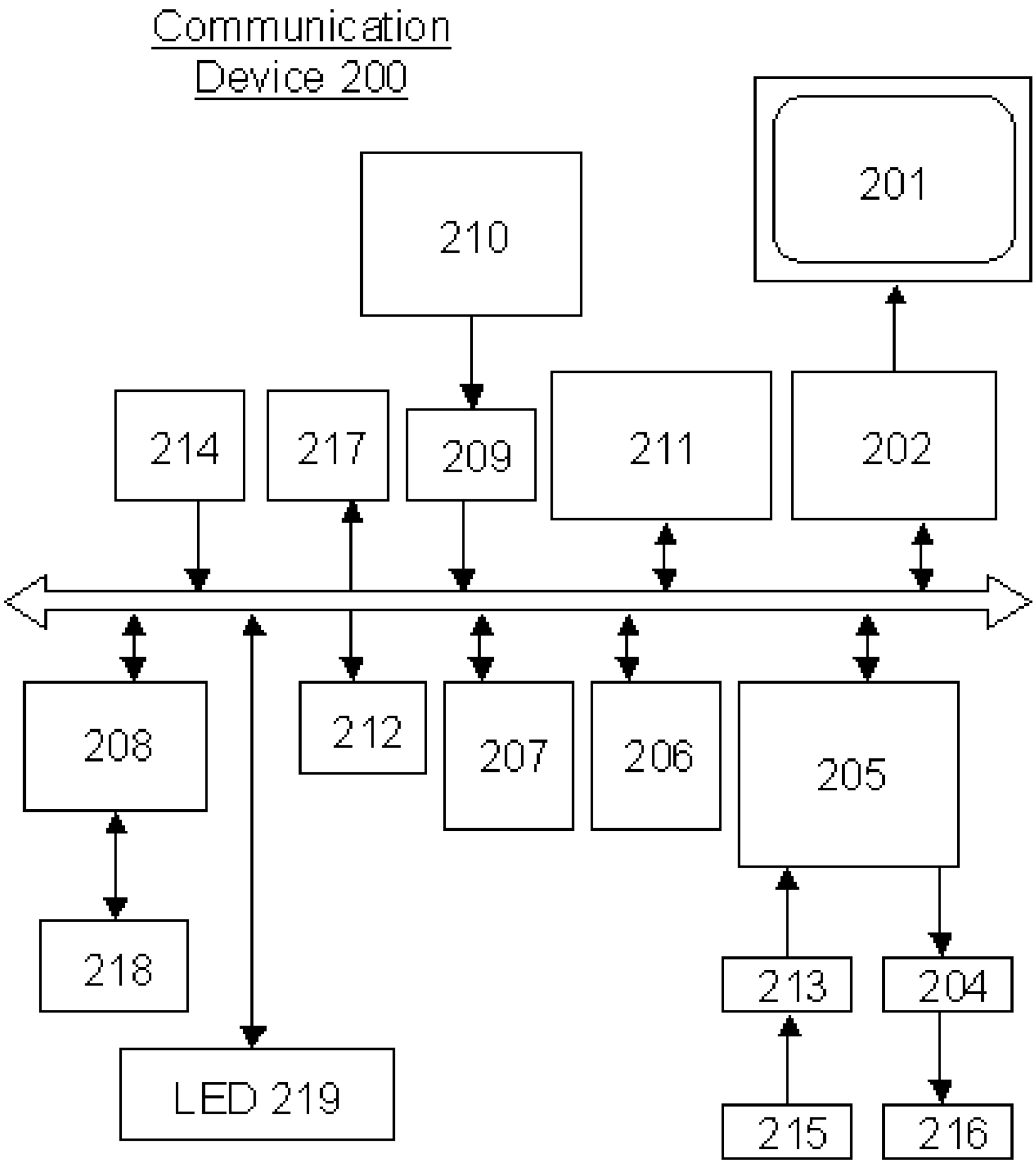

FIG. 380 is a block diagram illustrating an exemplary embodiment of the present invention.

Figure 381:
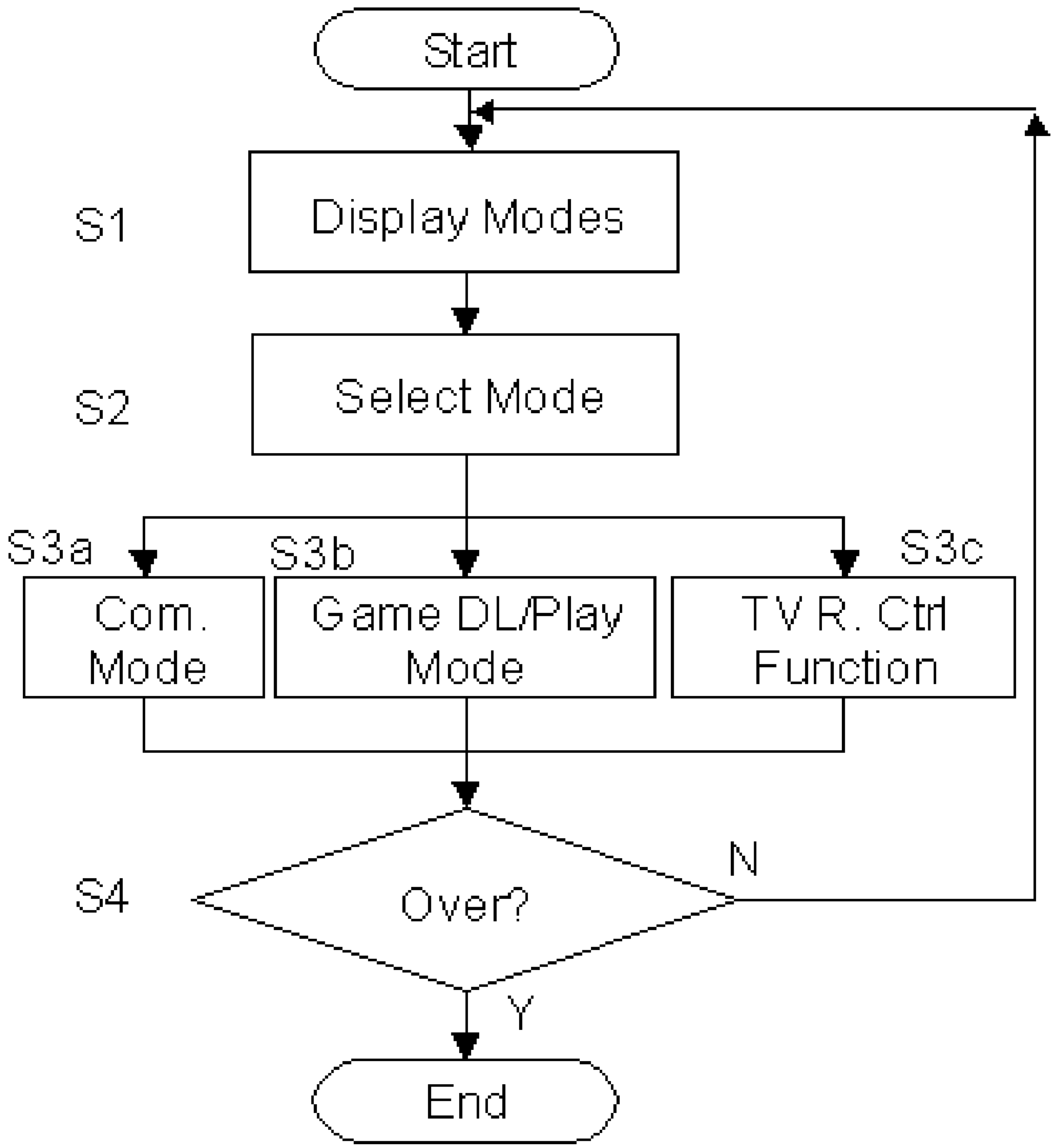

FIG. 381 is a flowchart illustrating an exemplary embodiment of the present invention.

Figure 382:
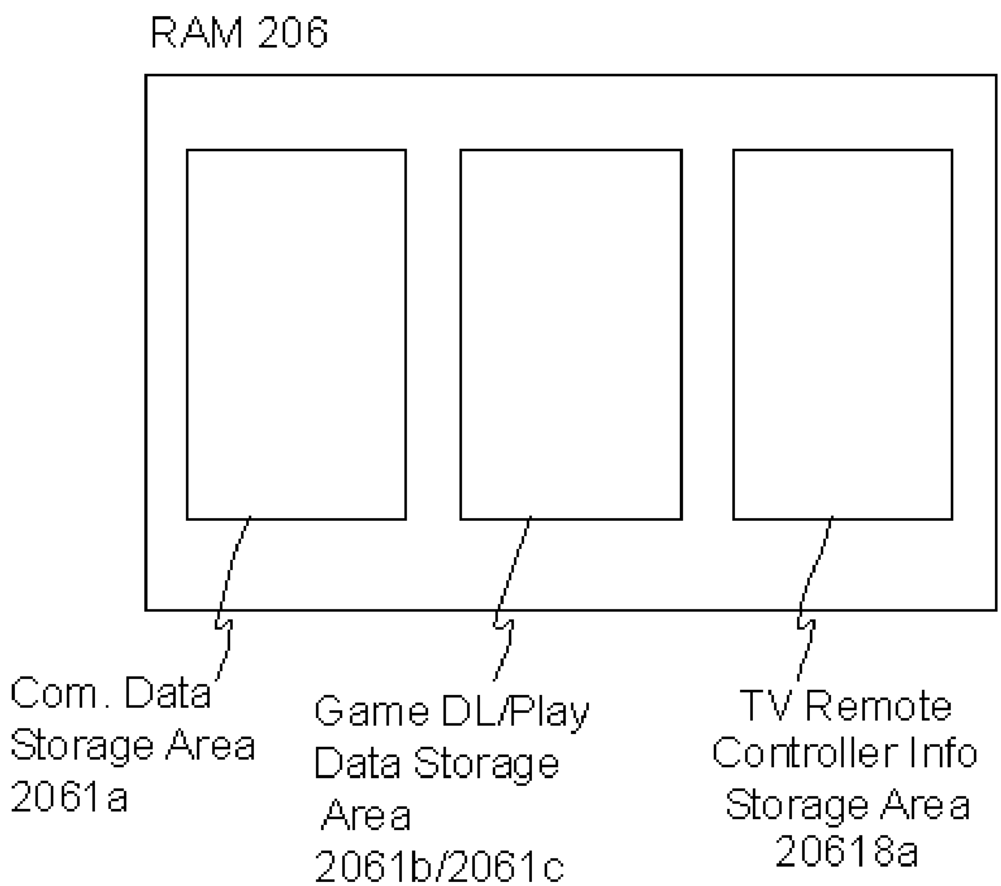

FIG. 382 is a block diagram illustrating an exemplary embodiment of the present invention.

Figure 383:
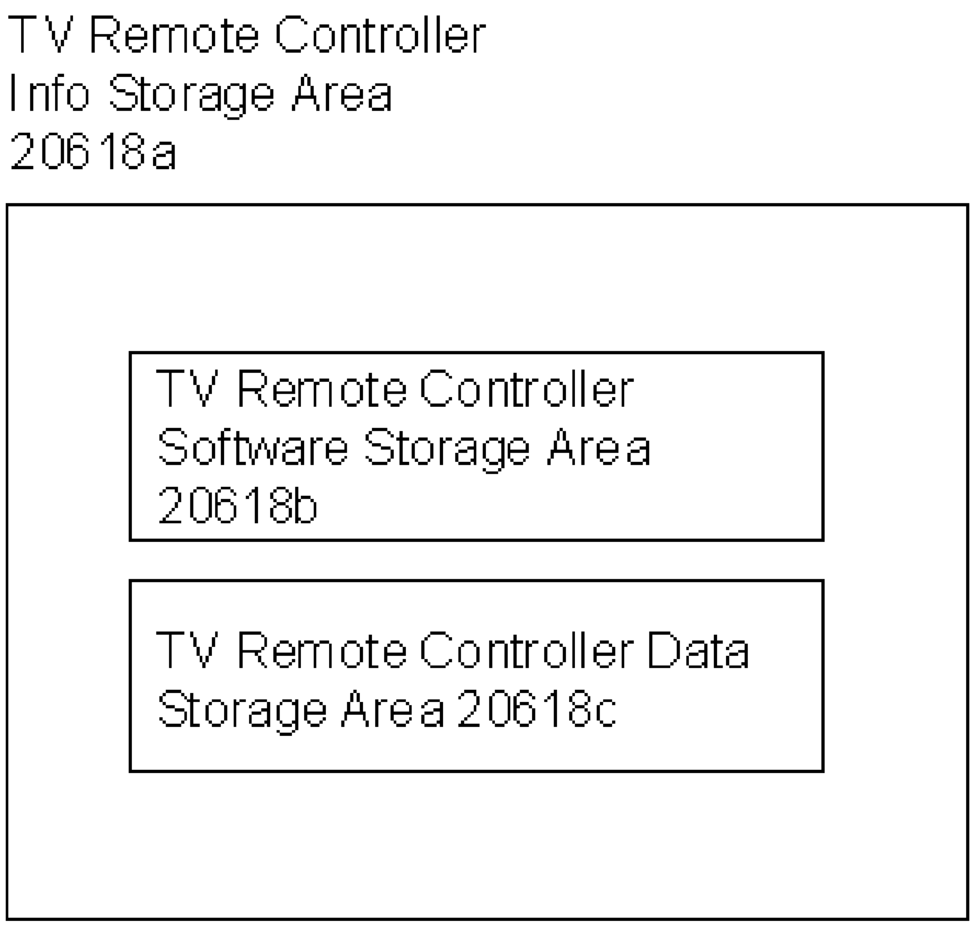

FIG. 383 is a block diagram illustrating an exemplary embodiment of the present invention.

Figure 384:
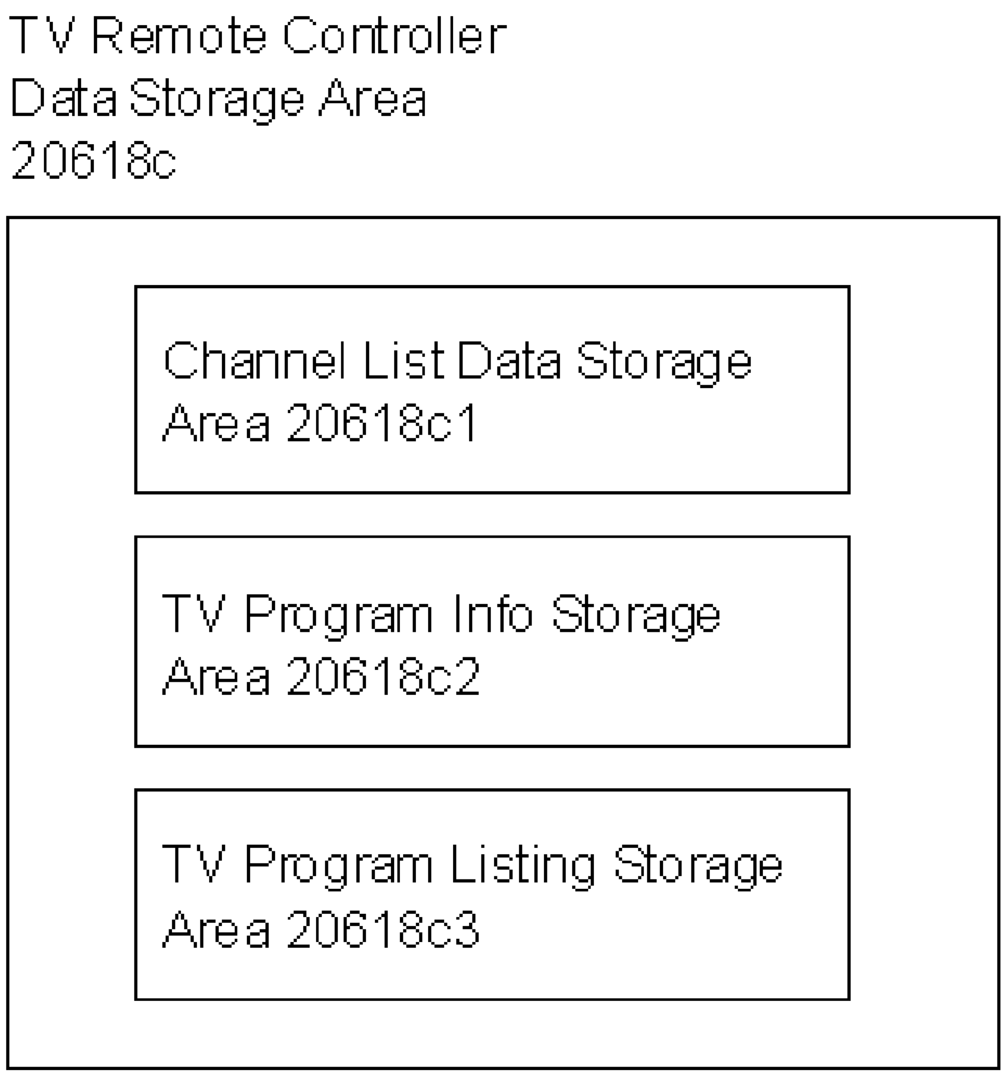

FIG. 384 is a block diagram illustrating an exemplary embodiment of the present invention.

Figure 385:
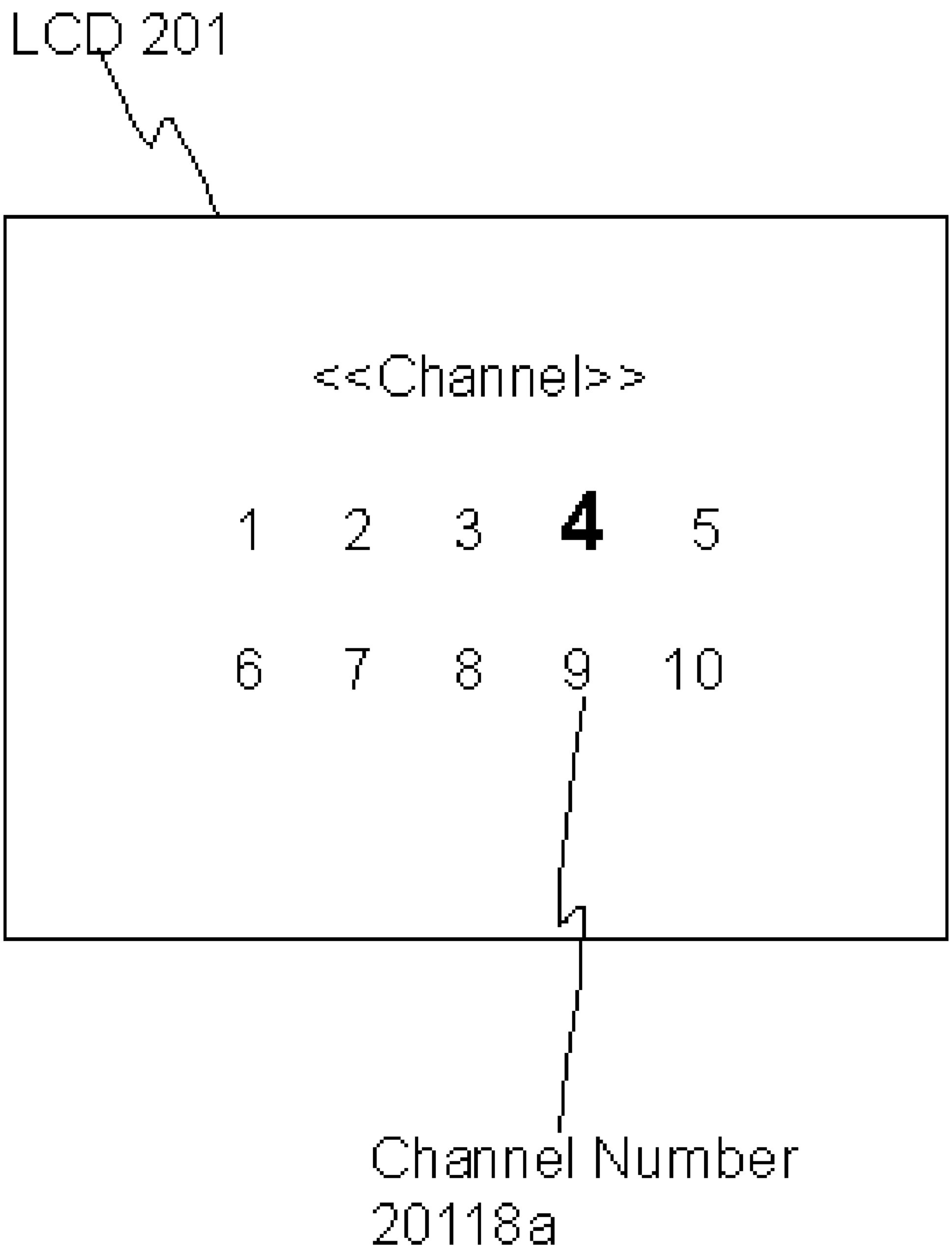

FIG. 385 is a simplified illustration illustrating an exemplary embodiment of the present invention.

Figure 386:
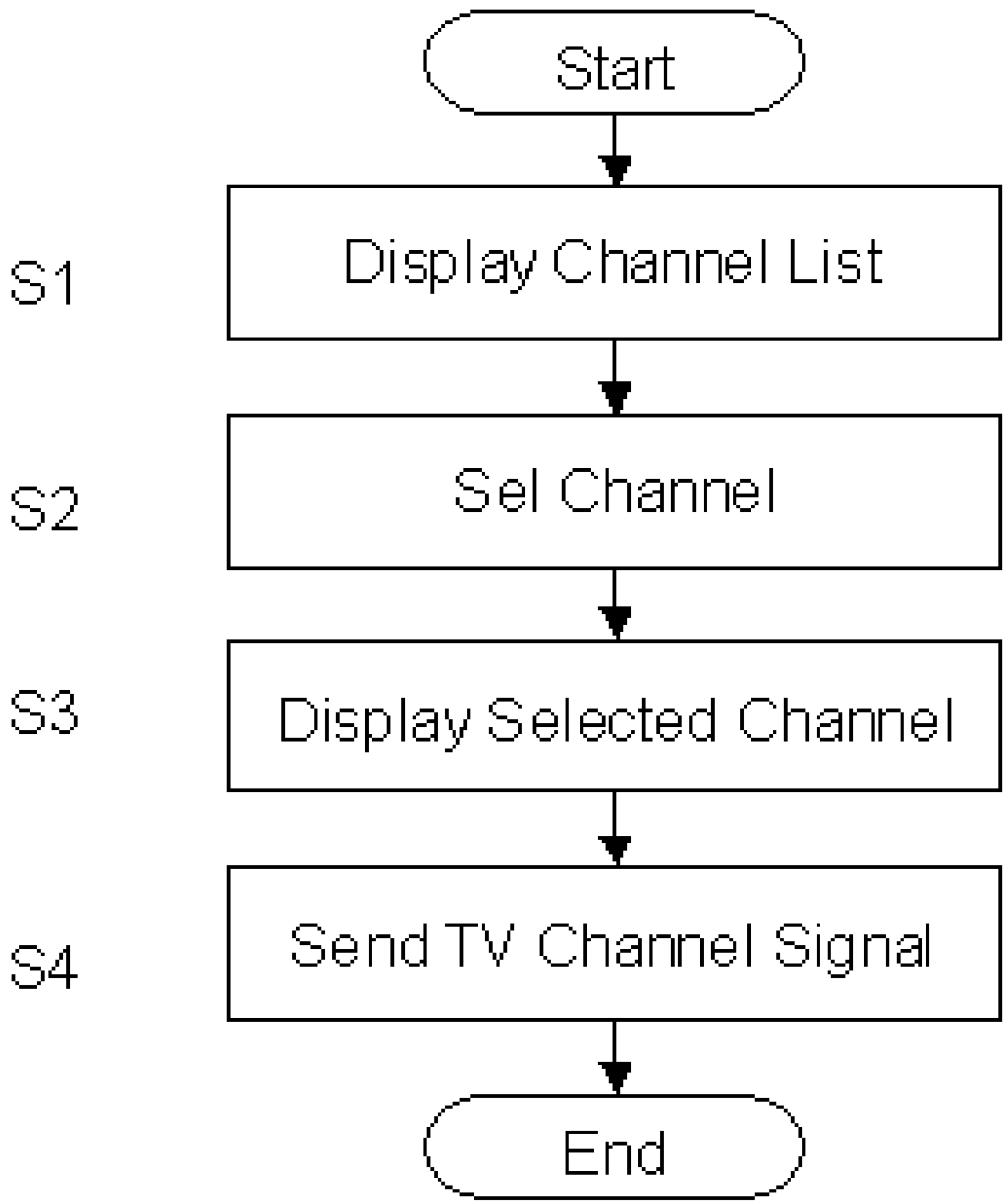

FIG. 386 is a flowchart illustrating an exemplary embodiment of the present invention.

Figure 387:
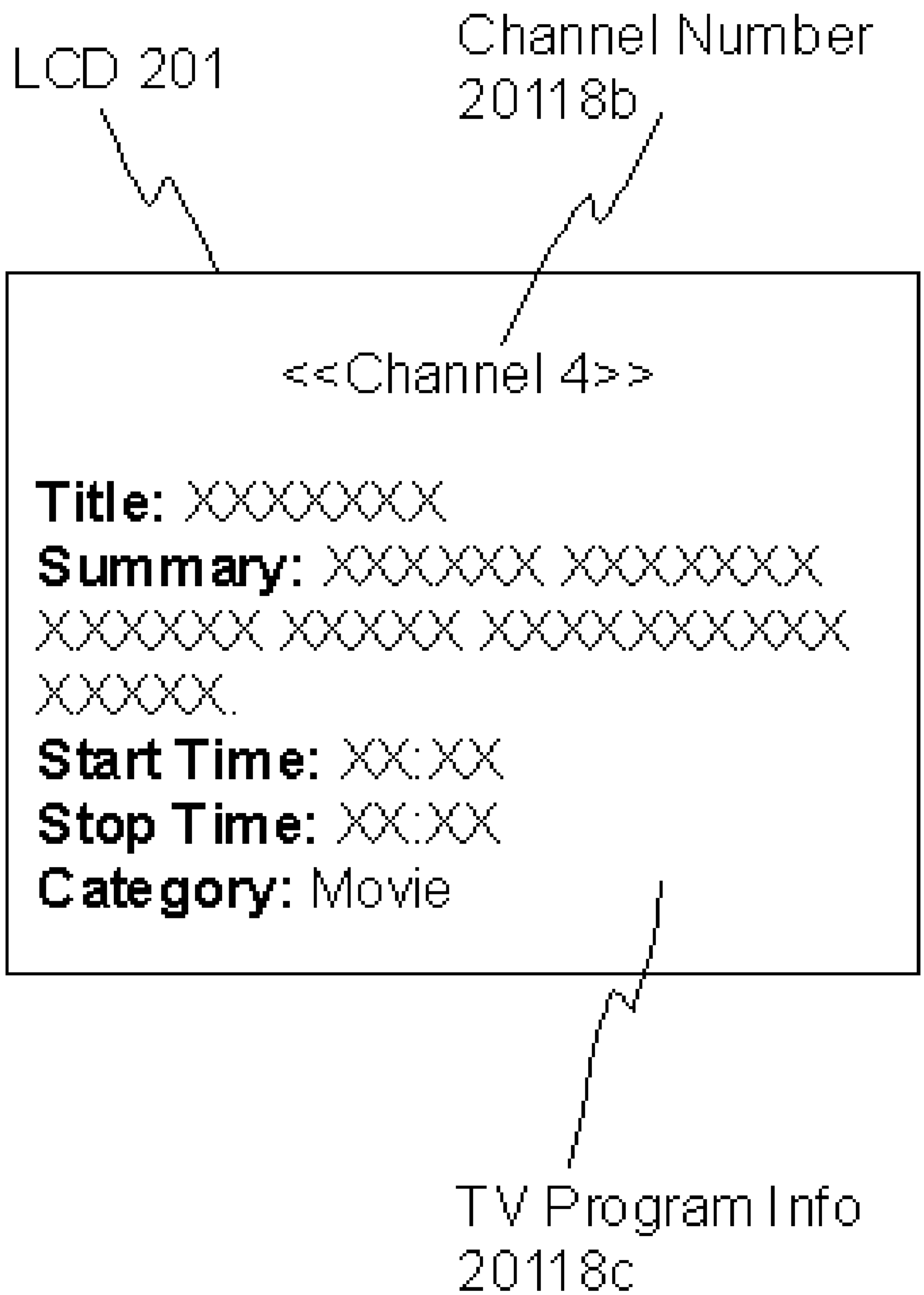

FIG. 387 is a simplified illustration illustrating an exemplary embodiment of the present invention.

Figure 388:
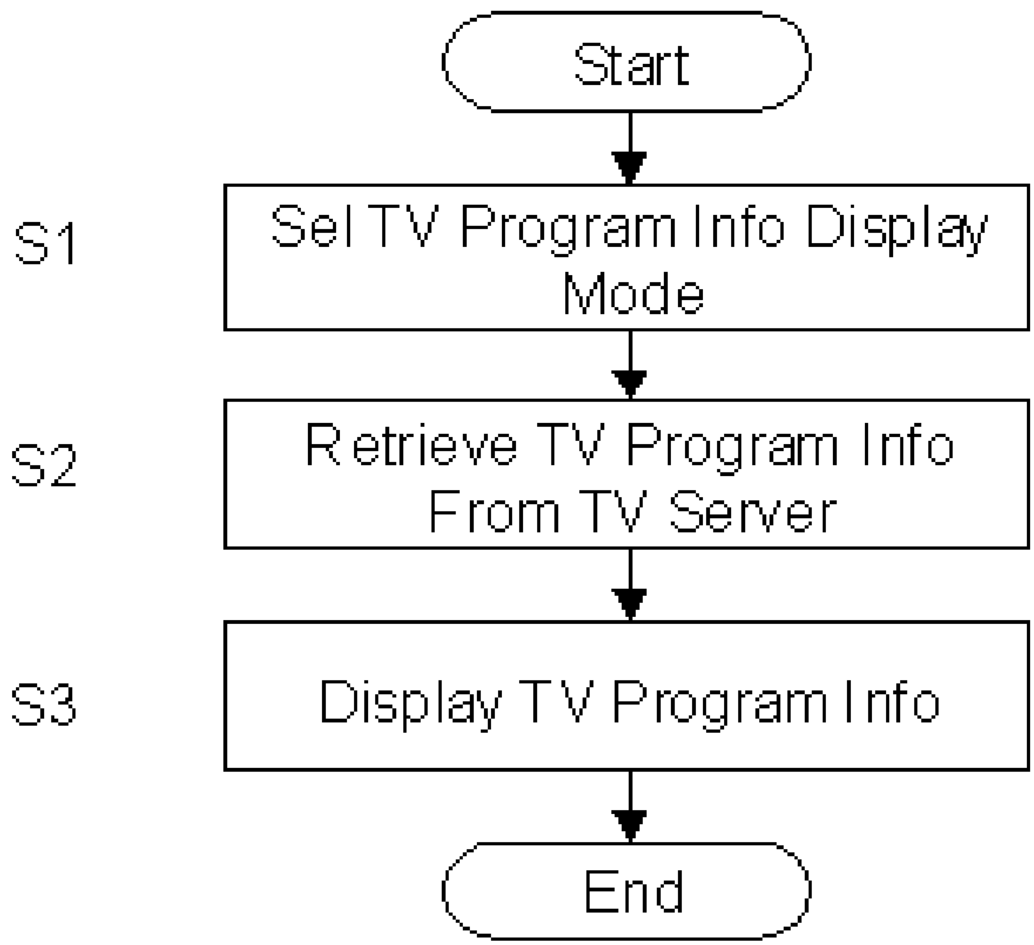

FIG. 388 is a flowchart illustrating an exemplary embodiment of the present invention.

Figure 389:
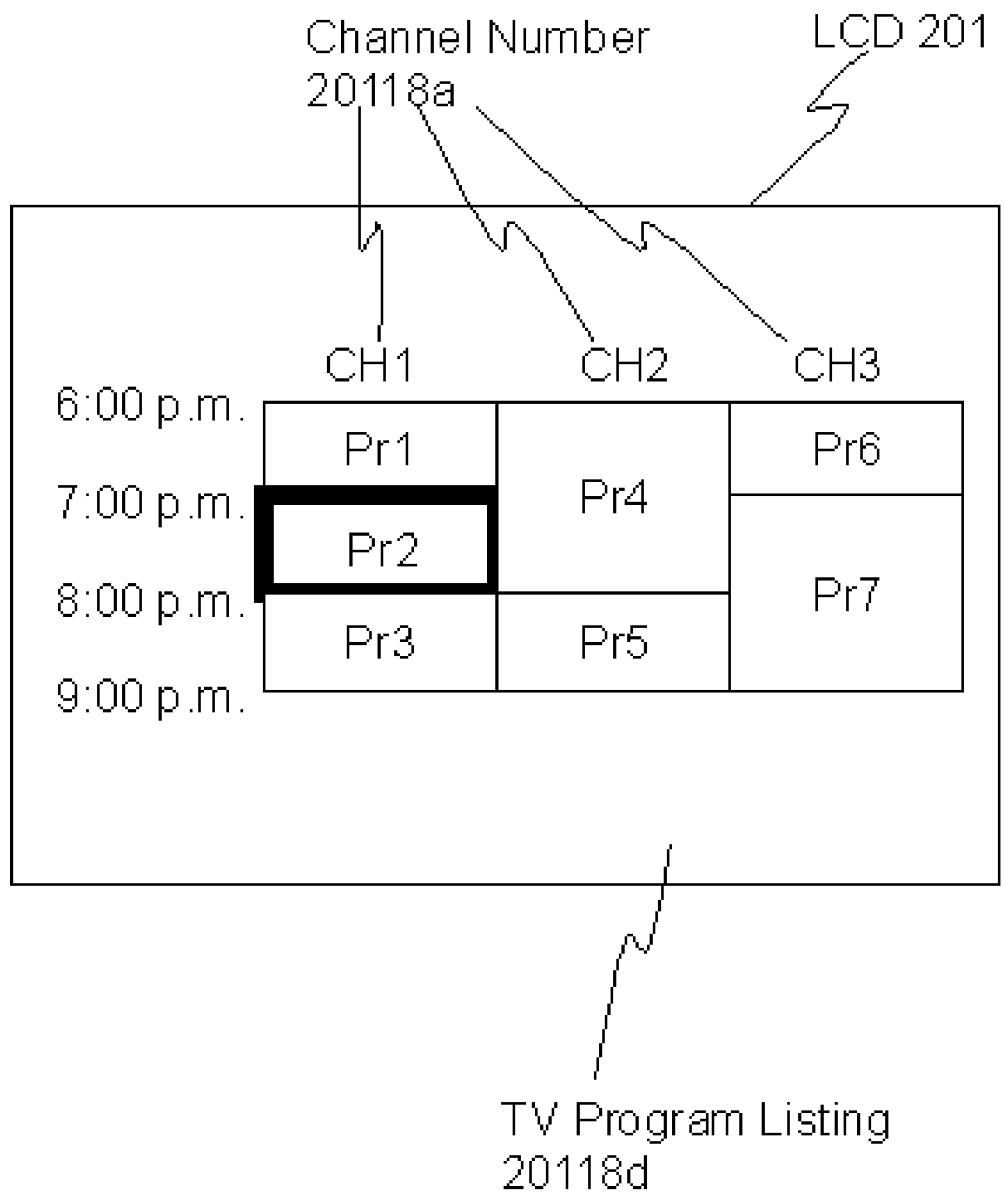

FIG. 389 is a simplified illustration illustrating an exemplary embodiment of the present invention.

Figure 390:
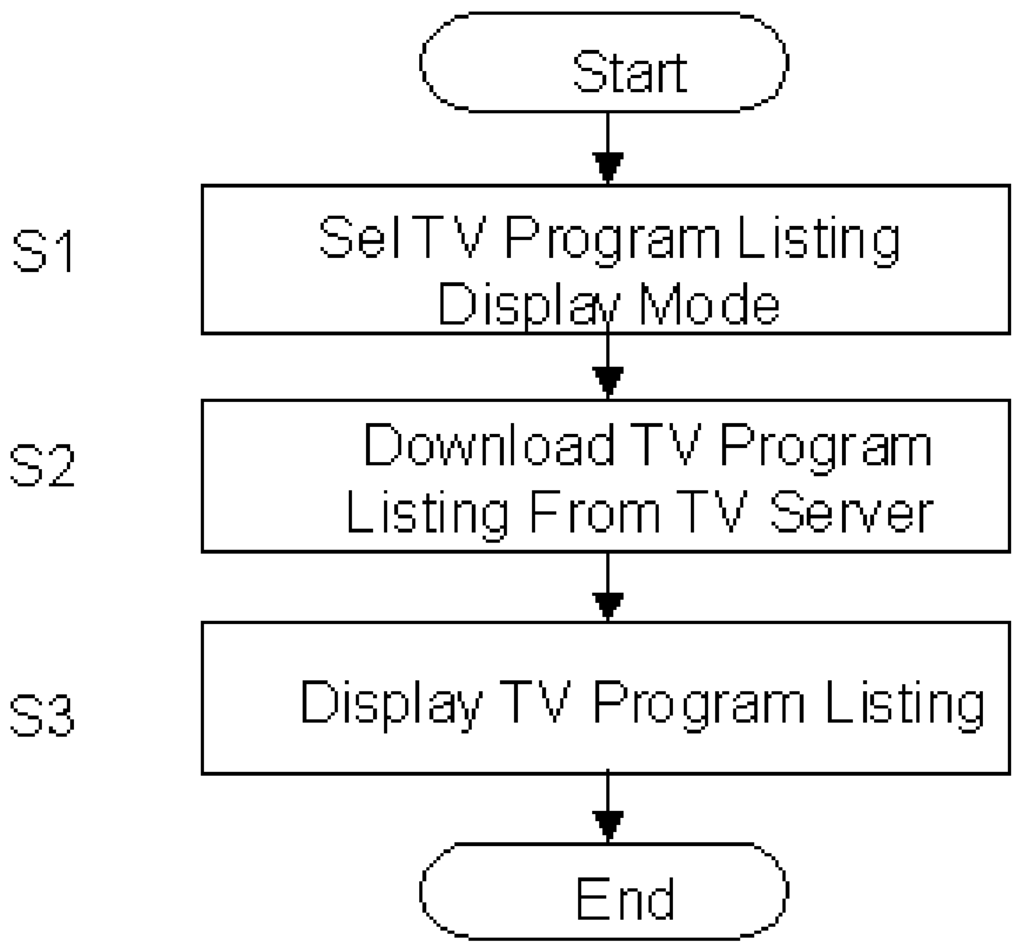

FIG. 390 is a flowchart illustrating an exemplary embodiment of the present invention.

Figure 391:
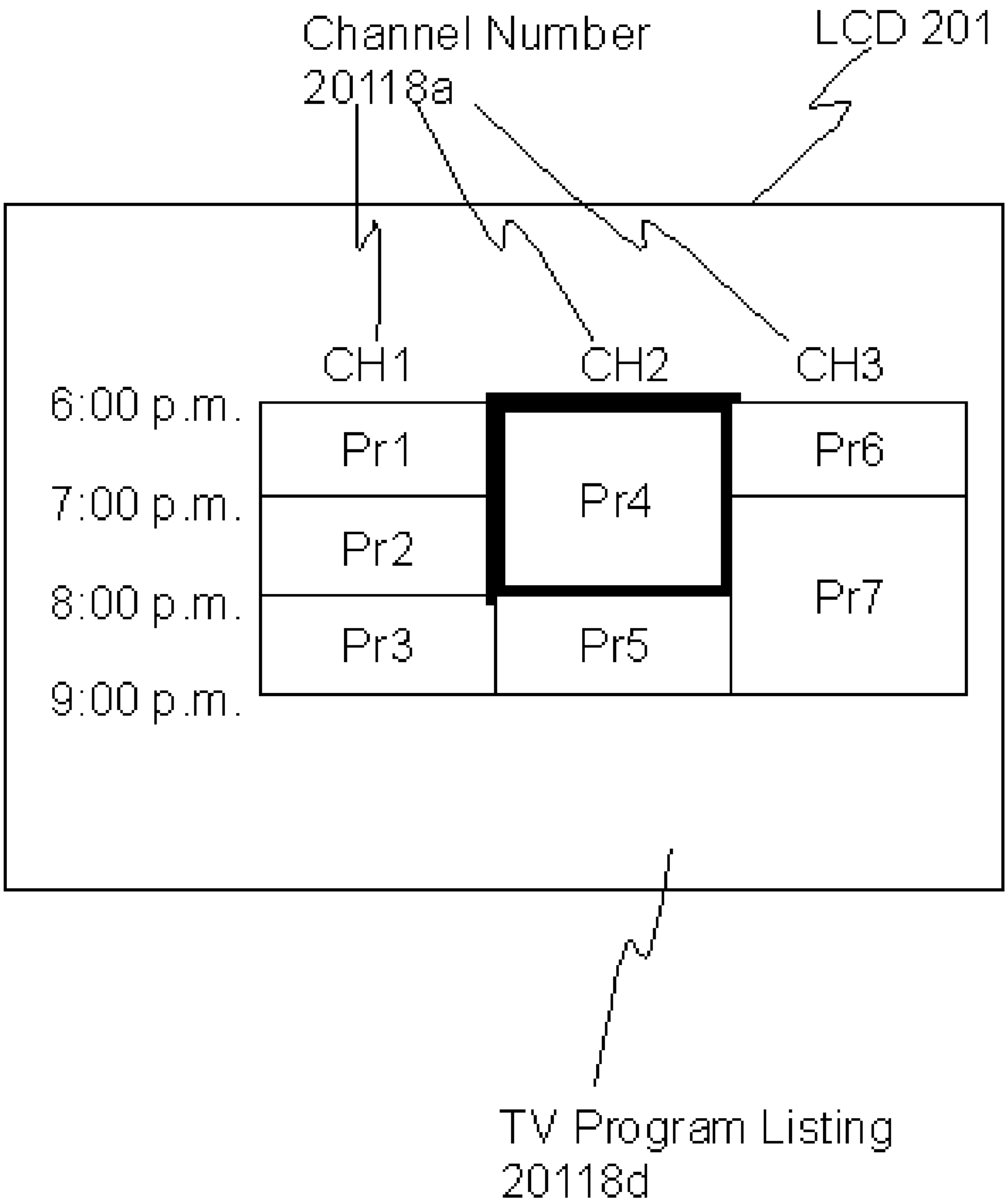

FIG. 391 is a simplified illustration illustrating an exemplary embodiment of the present invention.

Figure 392:
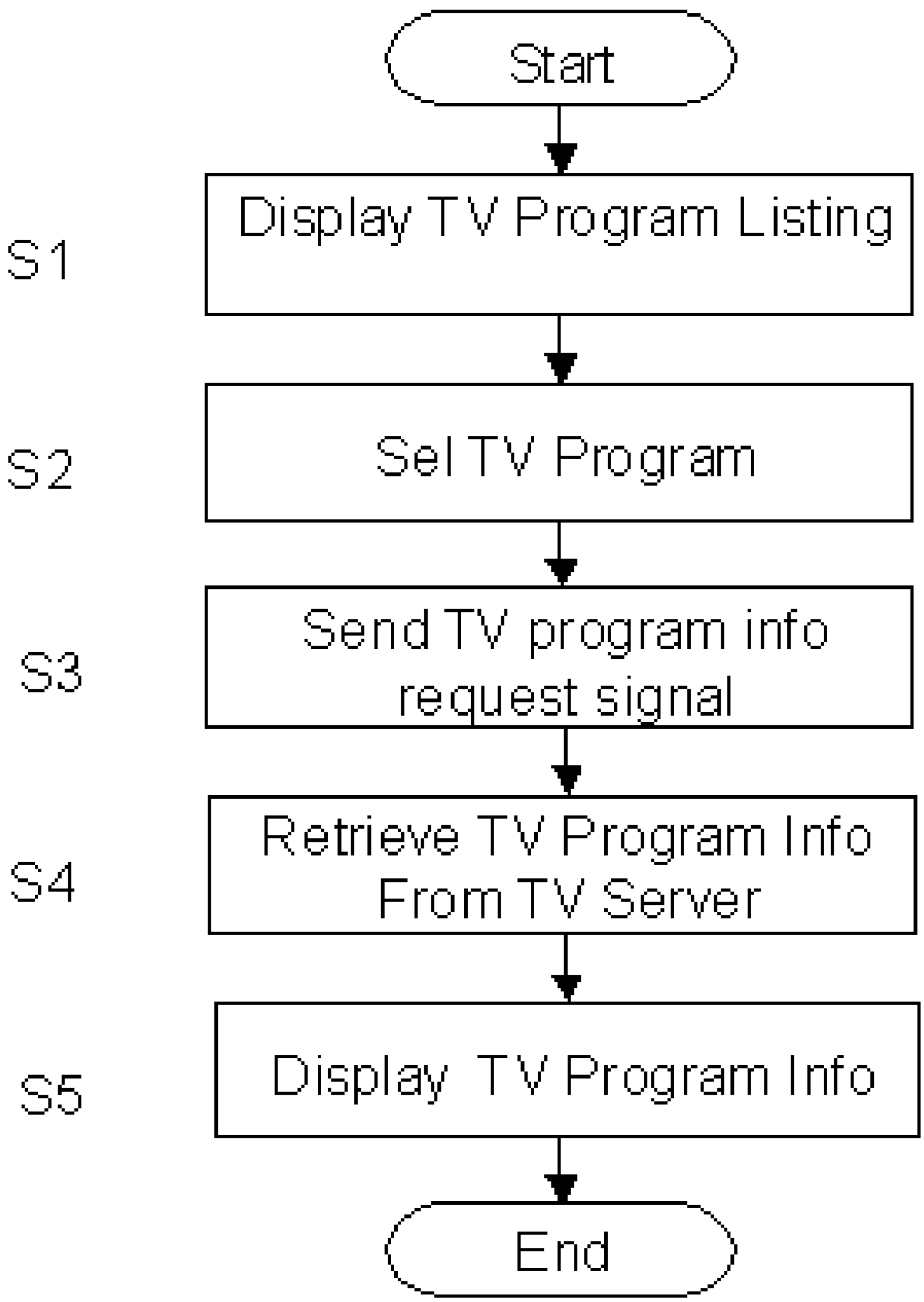

FIG. 392 is a flowchart illustrating an exemplary embodiment of the present invention.

Figure 393:
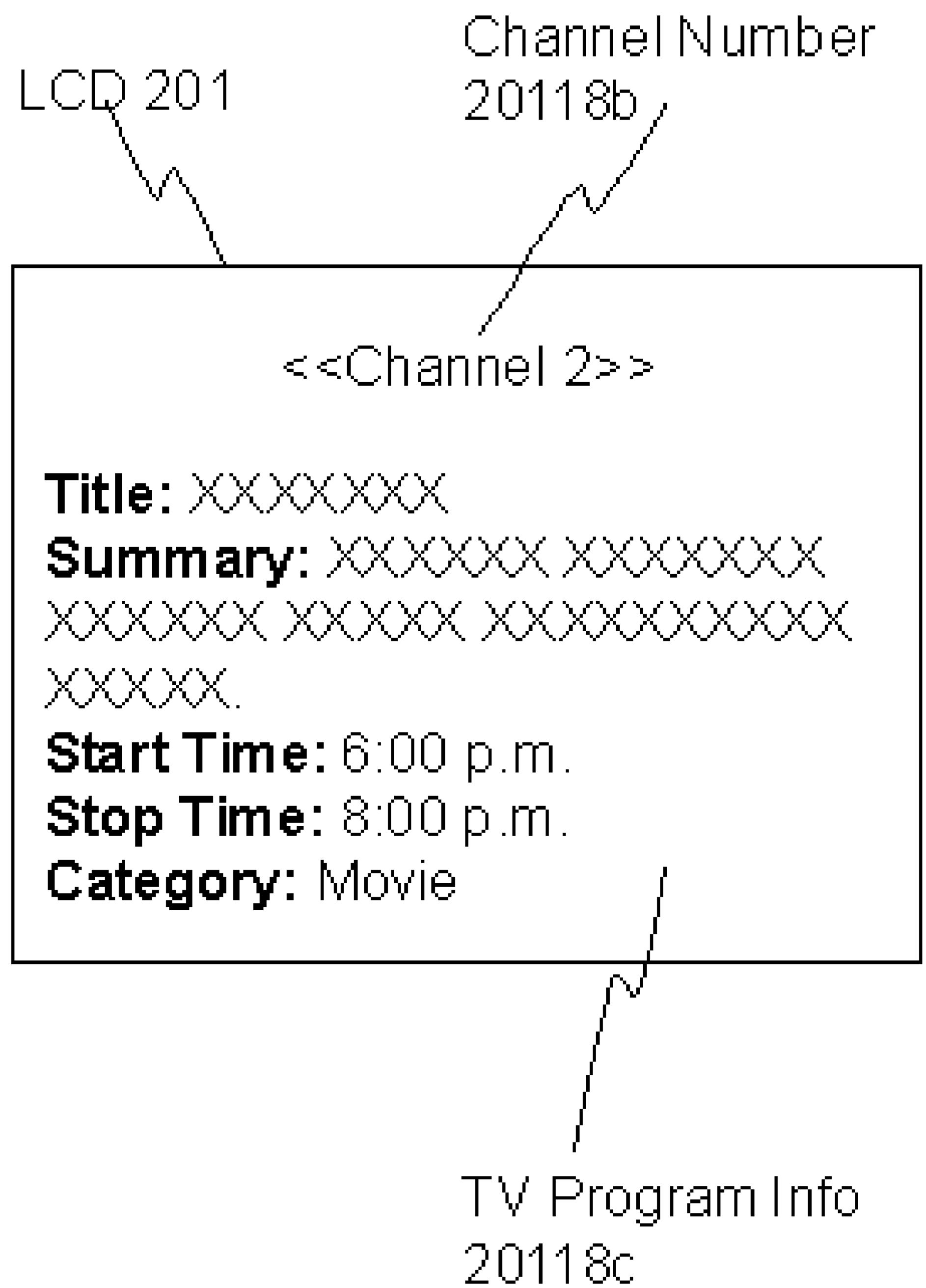

FIG. 393 is a simplified illustration illustrating an exemplary embodiment of the present invention.

Figure 394:
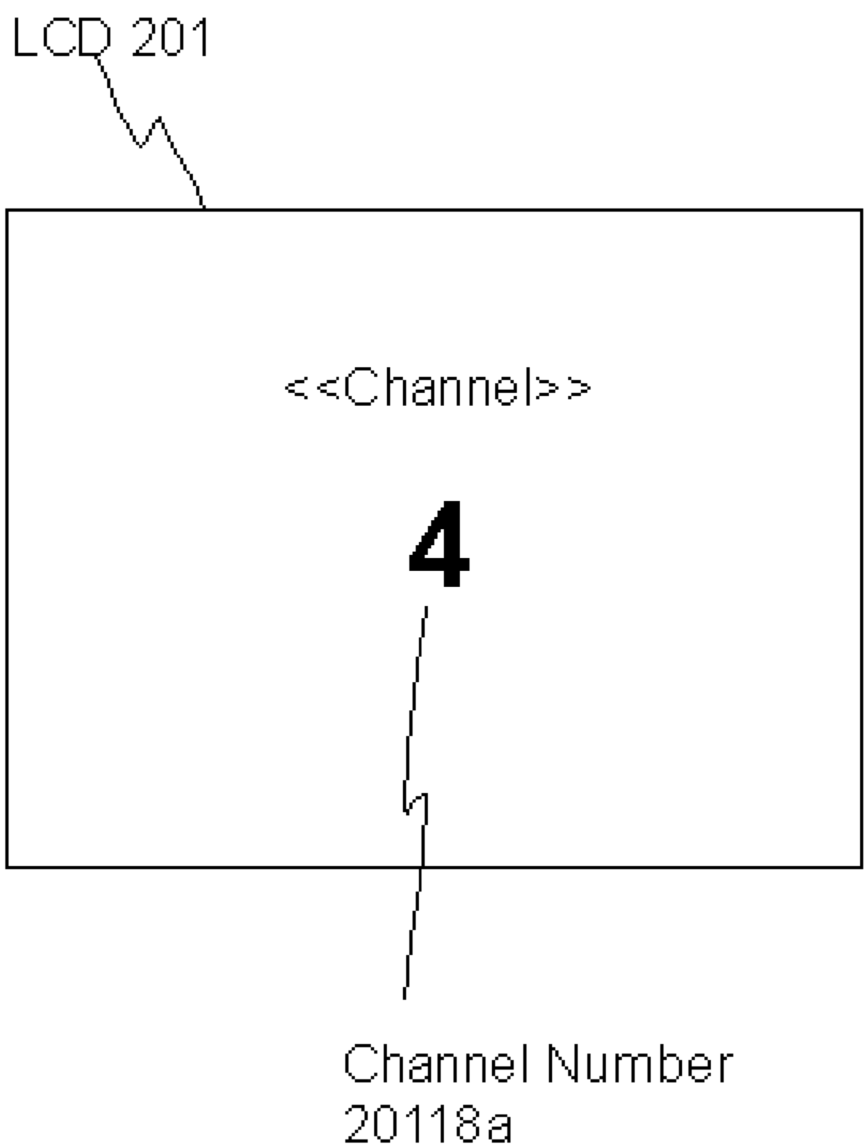

FIG. 394 is a simplified illustration illustrating an exemplary embodiment of the present invention.

Figure 395:
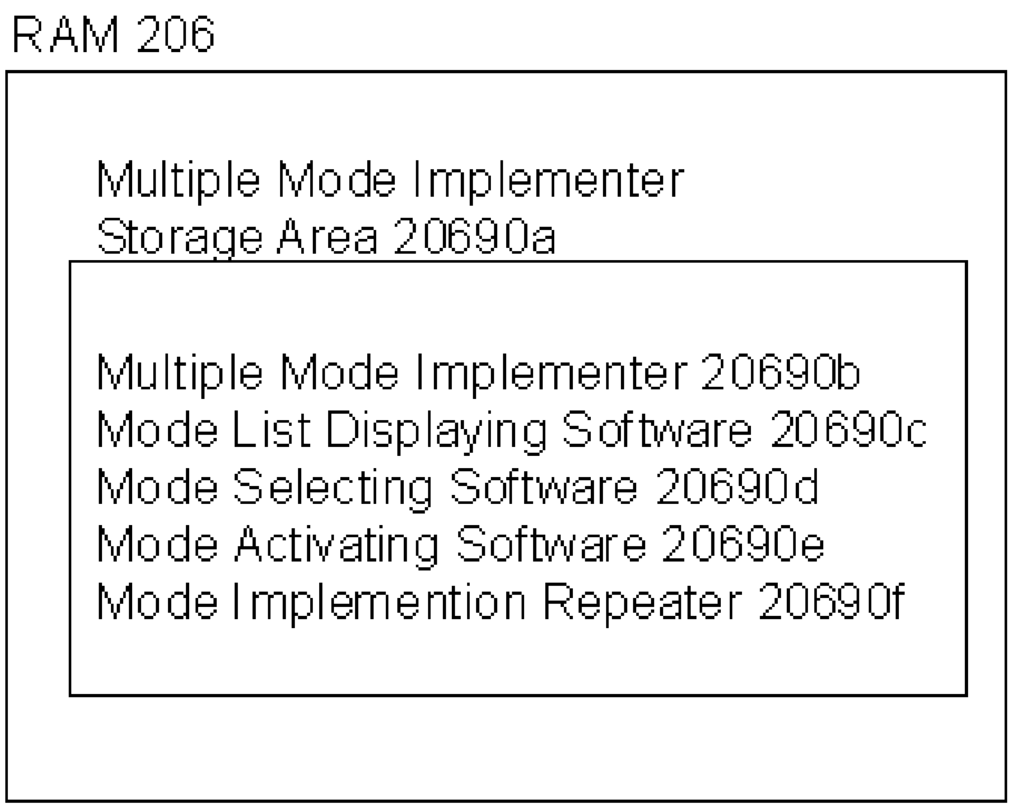

FIG. 395 is a block diagram illustrating an exemplary embodiment of the present invention.

Figure 396:
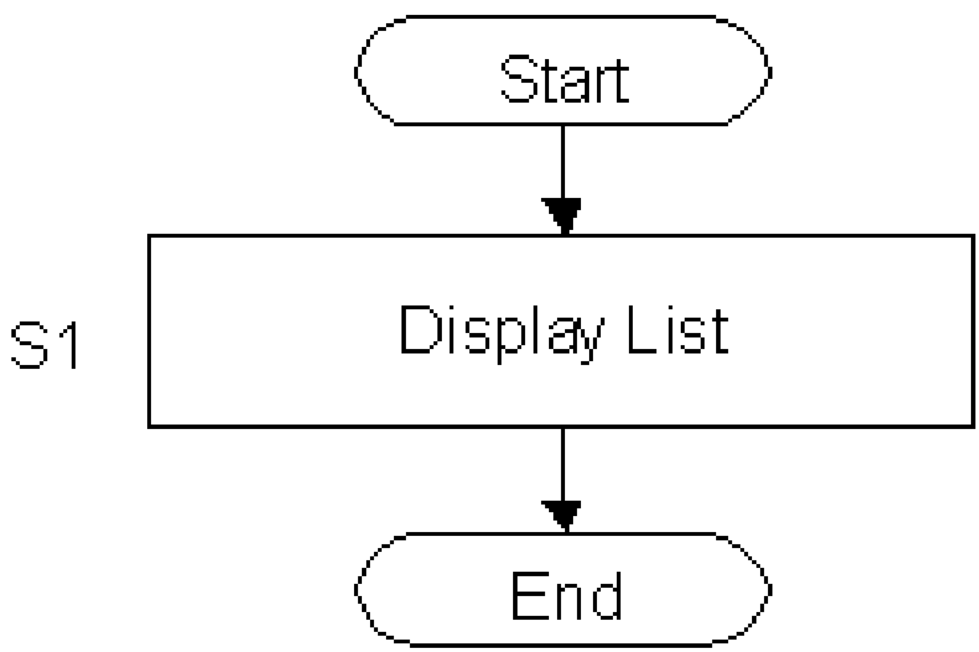

FIG. 396 is a flowchart illustrating an exemplary embodiment of the present invention.

Figure 397:
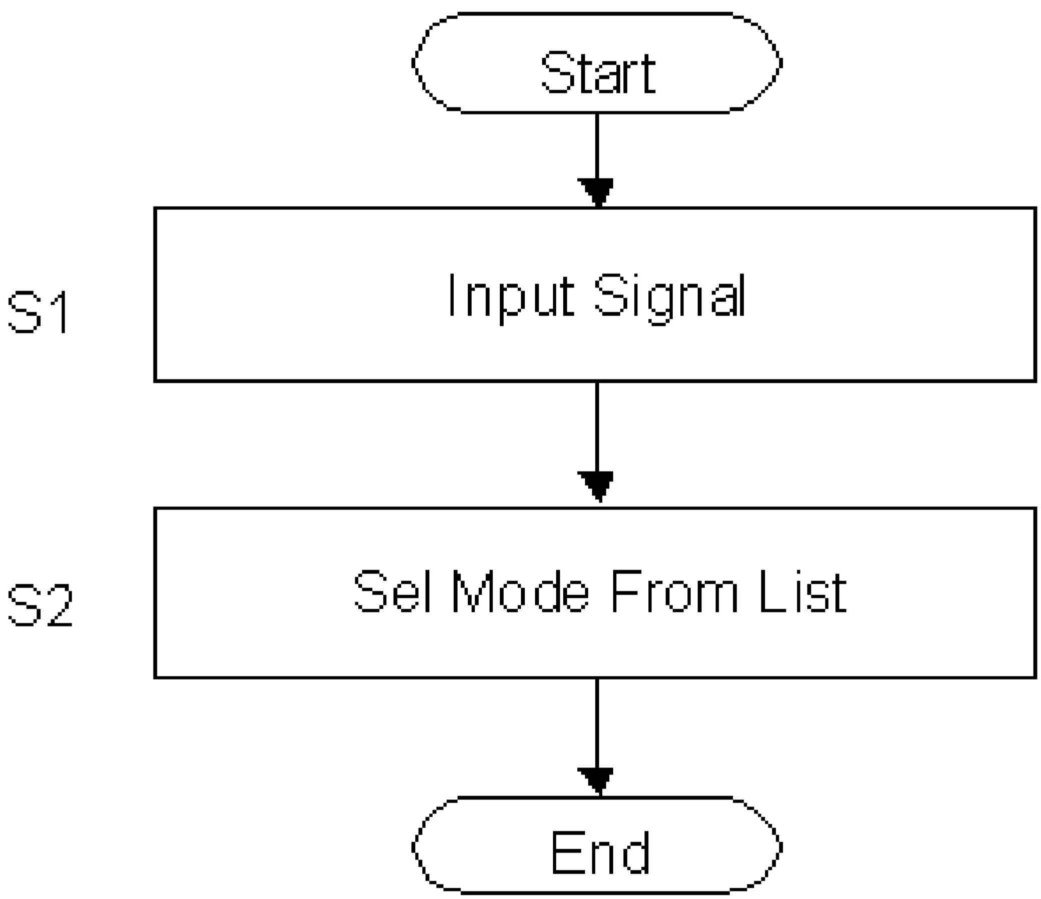

FIG. 397 is a flowchart illustrating an exemplary embodiment of the present invention.

Figure 398:
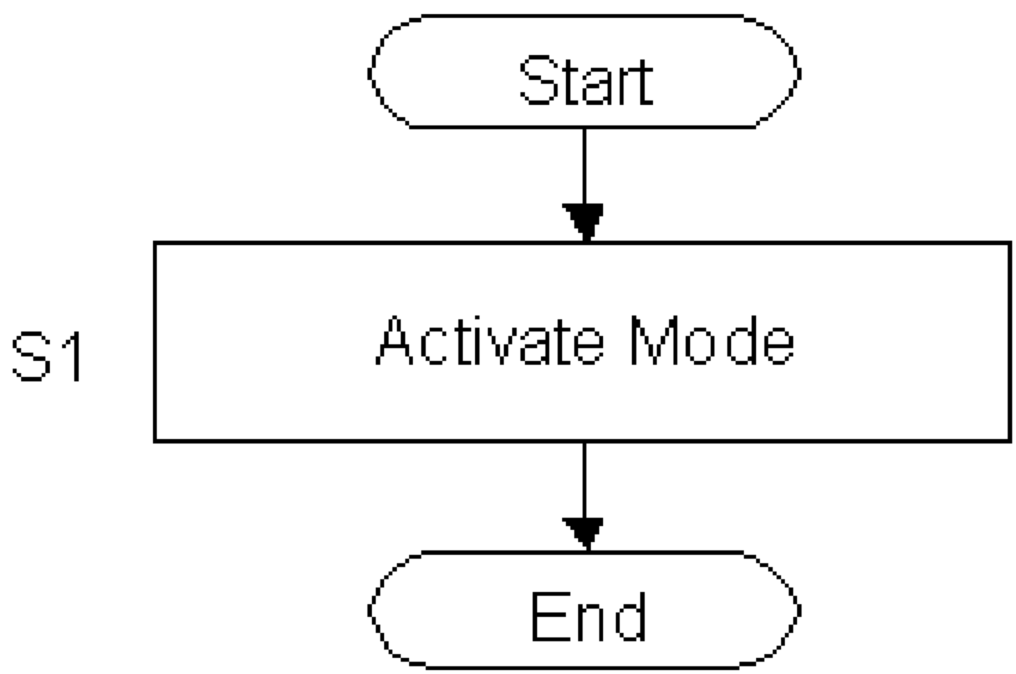

FIG. 398 is a flowchart illustrating an exemplary embodiment of the present invention.

Figure 399:
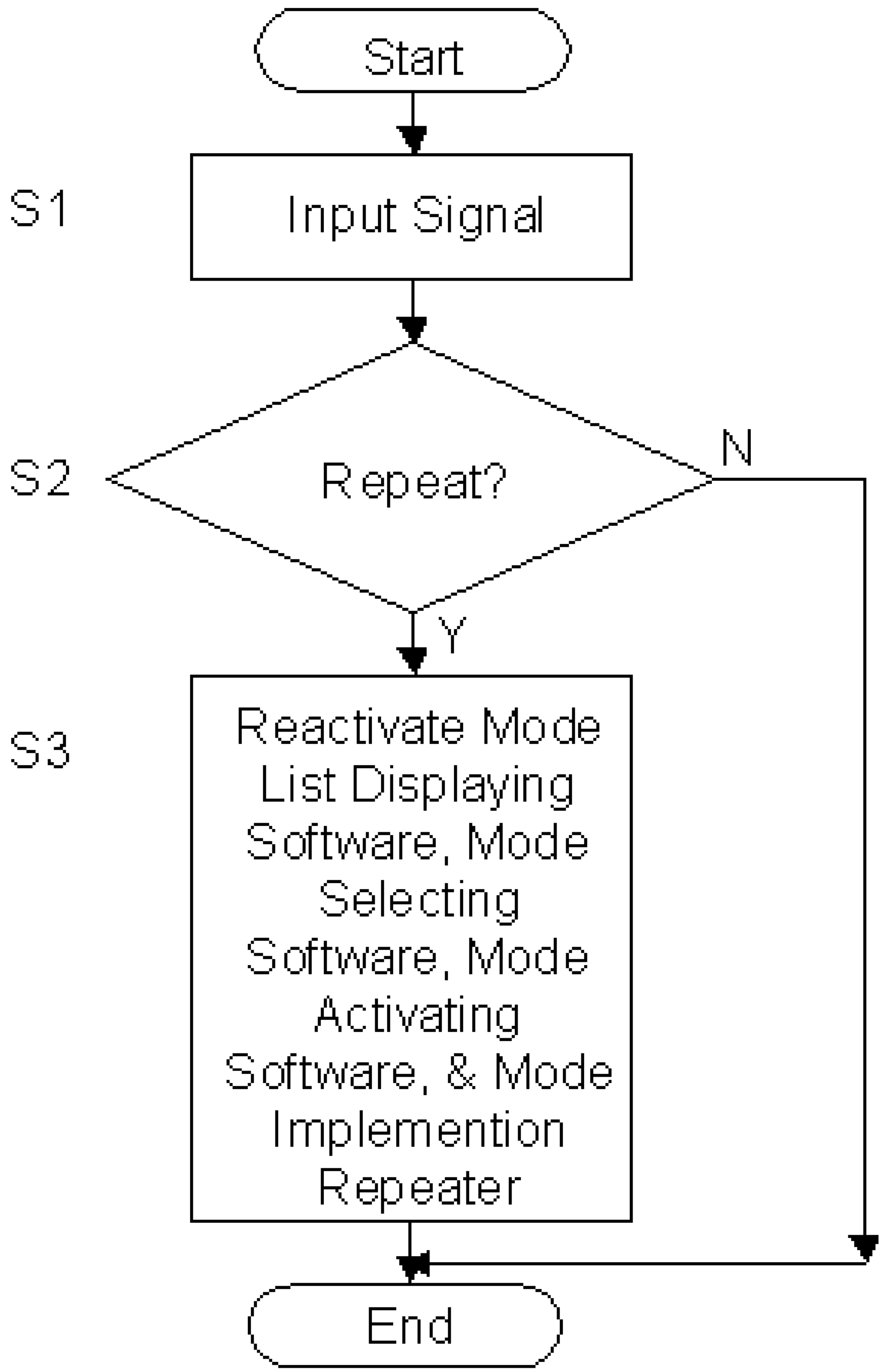

FIG. 399 is a flowchart illustrating an exemplary embodiment of the present invention.

Figure 400:
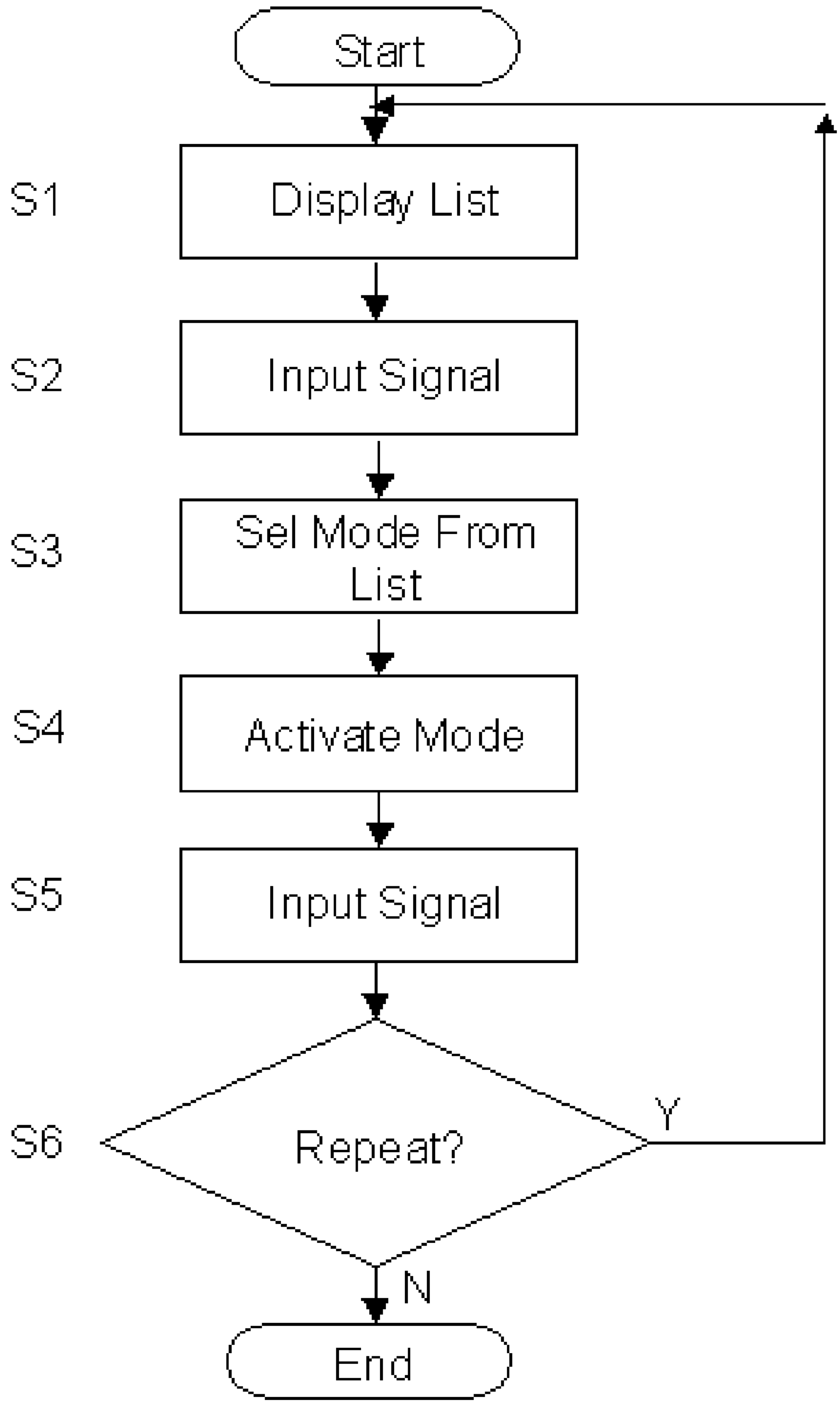

FIG. 400 is a flowchart illustrating an exemplary embodiment of the present invention.

Figure 401:
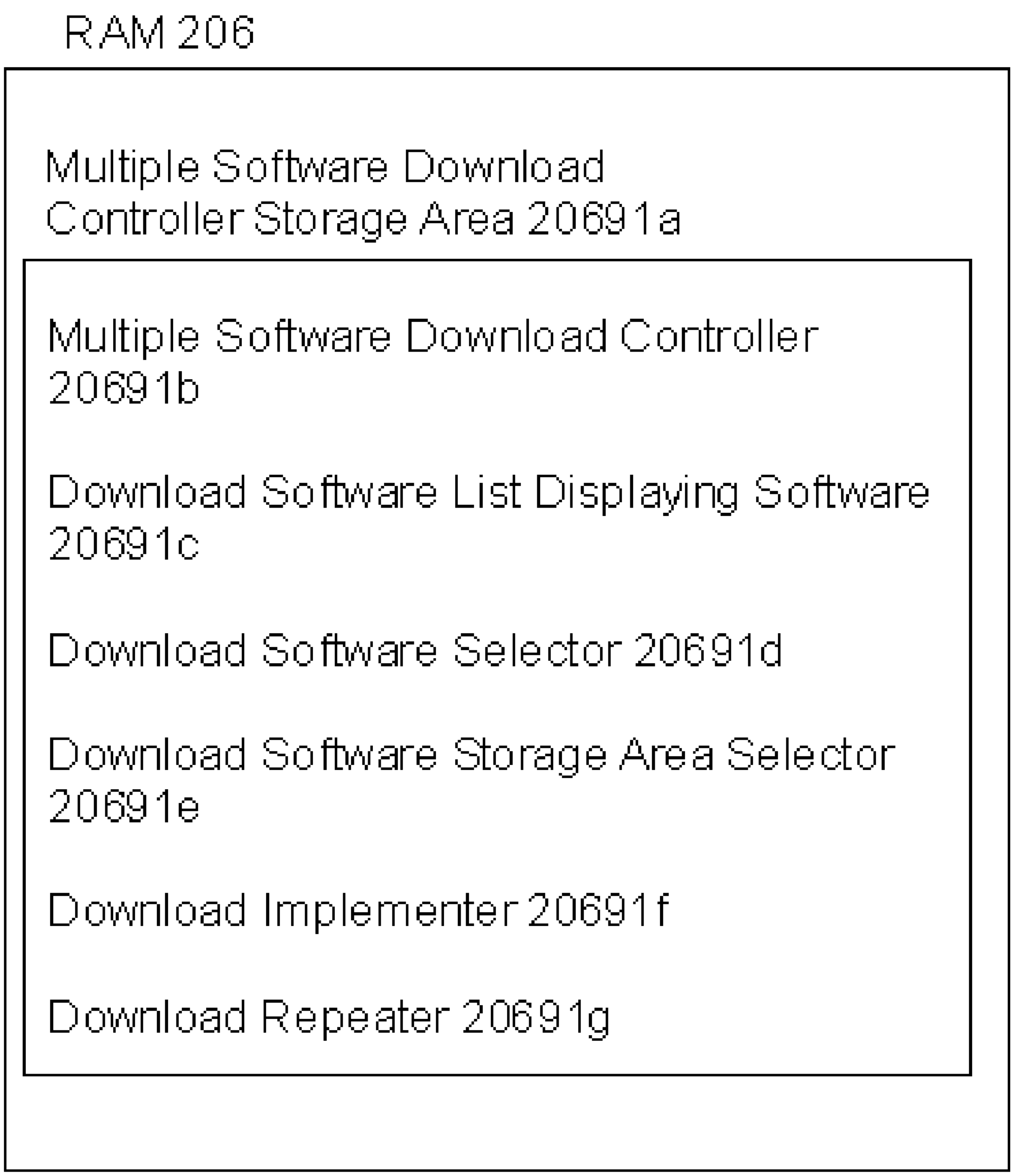

FIG. 401 is a block diagram illustrating an exemplary embodiment of the present invention.

Figure 402:
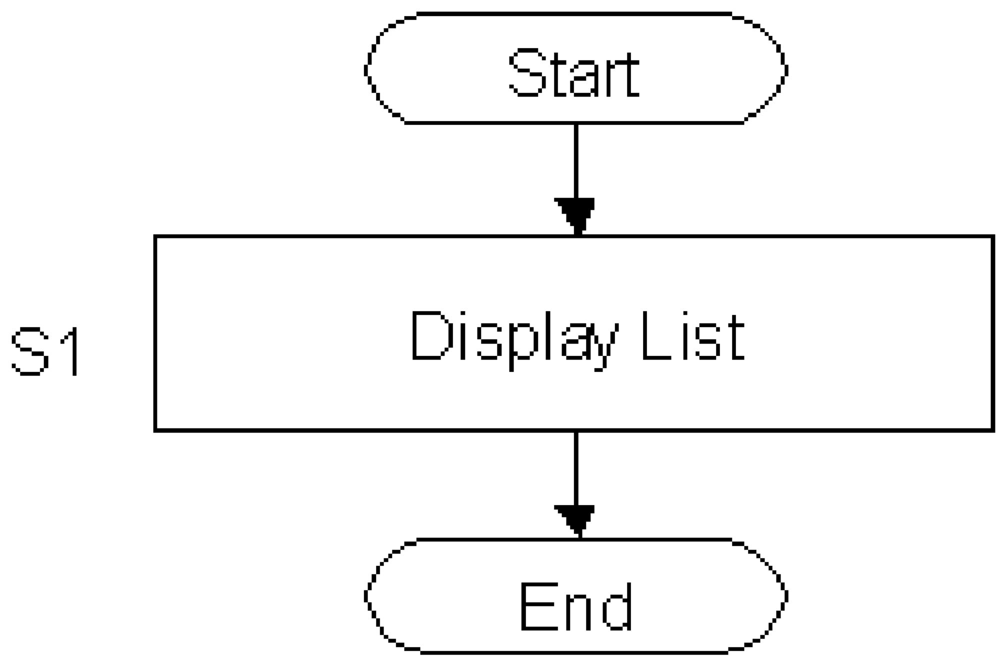

FIG. 402 is a flowchart illustrating an exemplary embodiment of the present invention.

Figure 403:
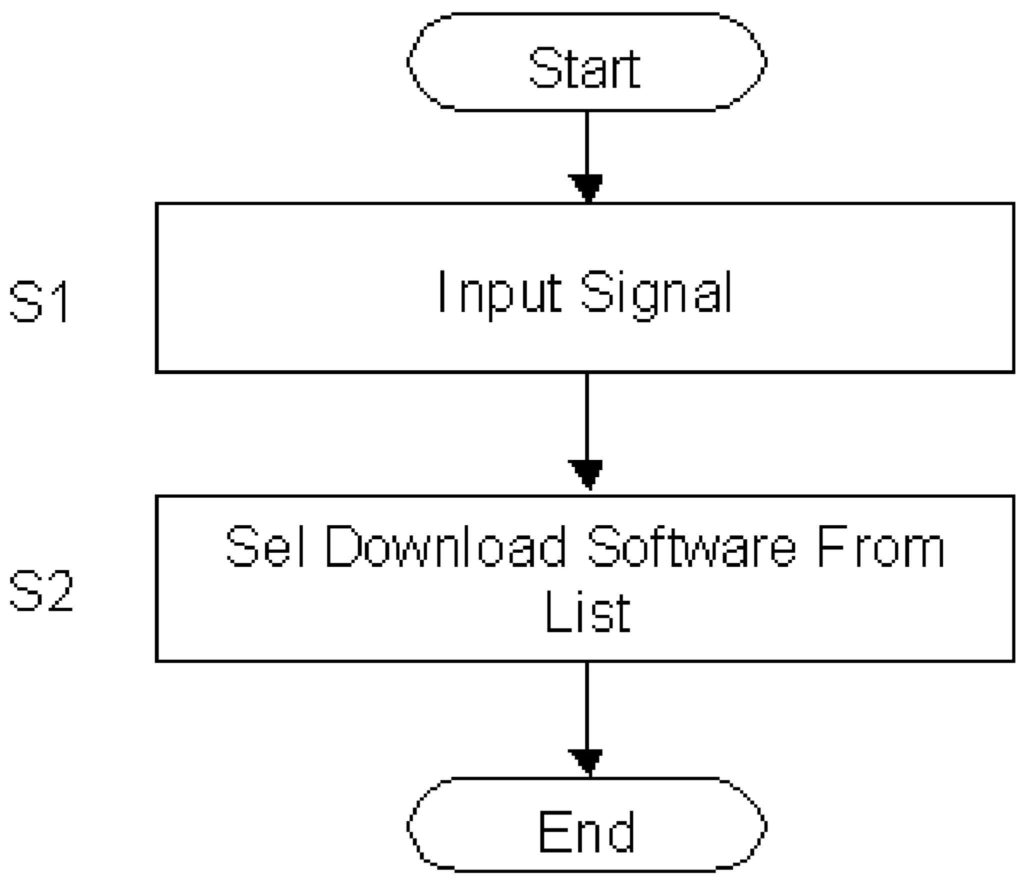

FIG. 403 is a flowchart illustrating an exemplary embodiment of the present invention.

Figure 404:
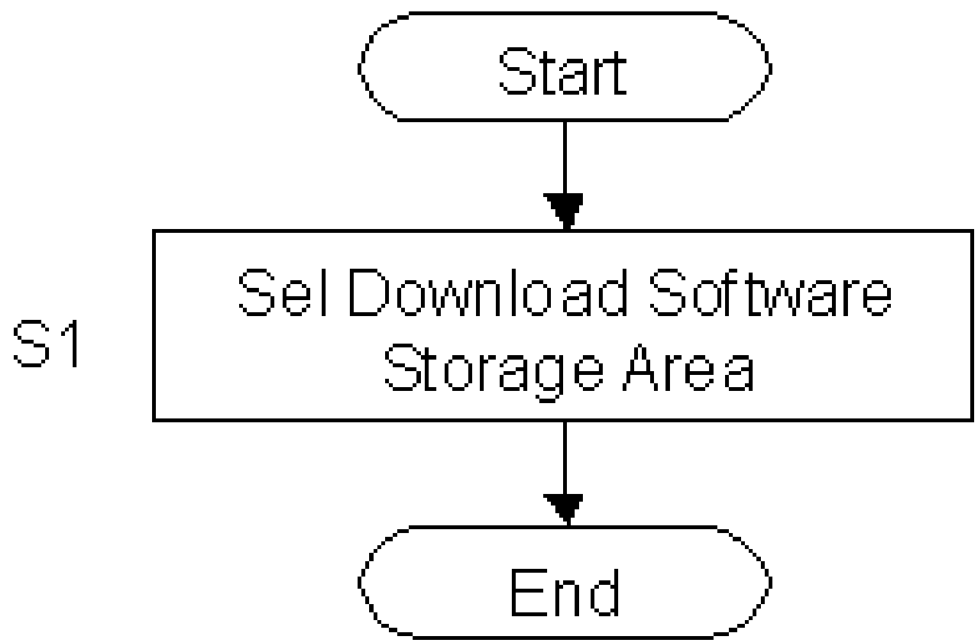

FIG. 404 is a flowchart illustrating an exemplary embodiment of the present invention.

Figure 405:
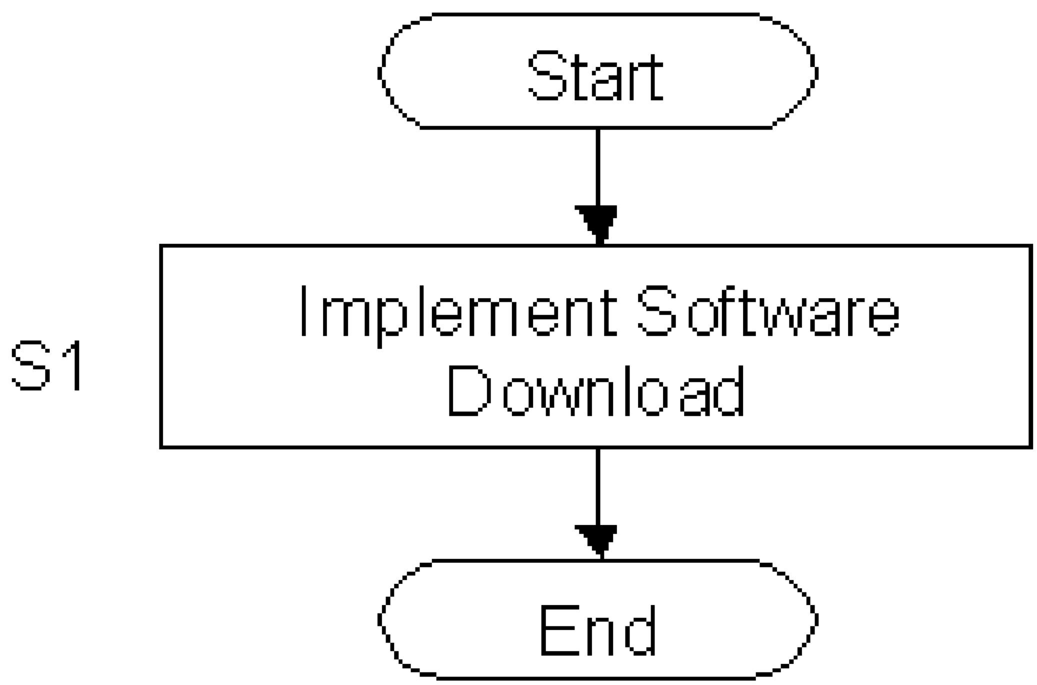

FIG. 405 is a flowchart illustrating an exemplary embodiment of the present invention.

Figure 406:
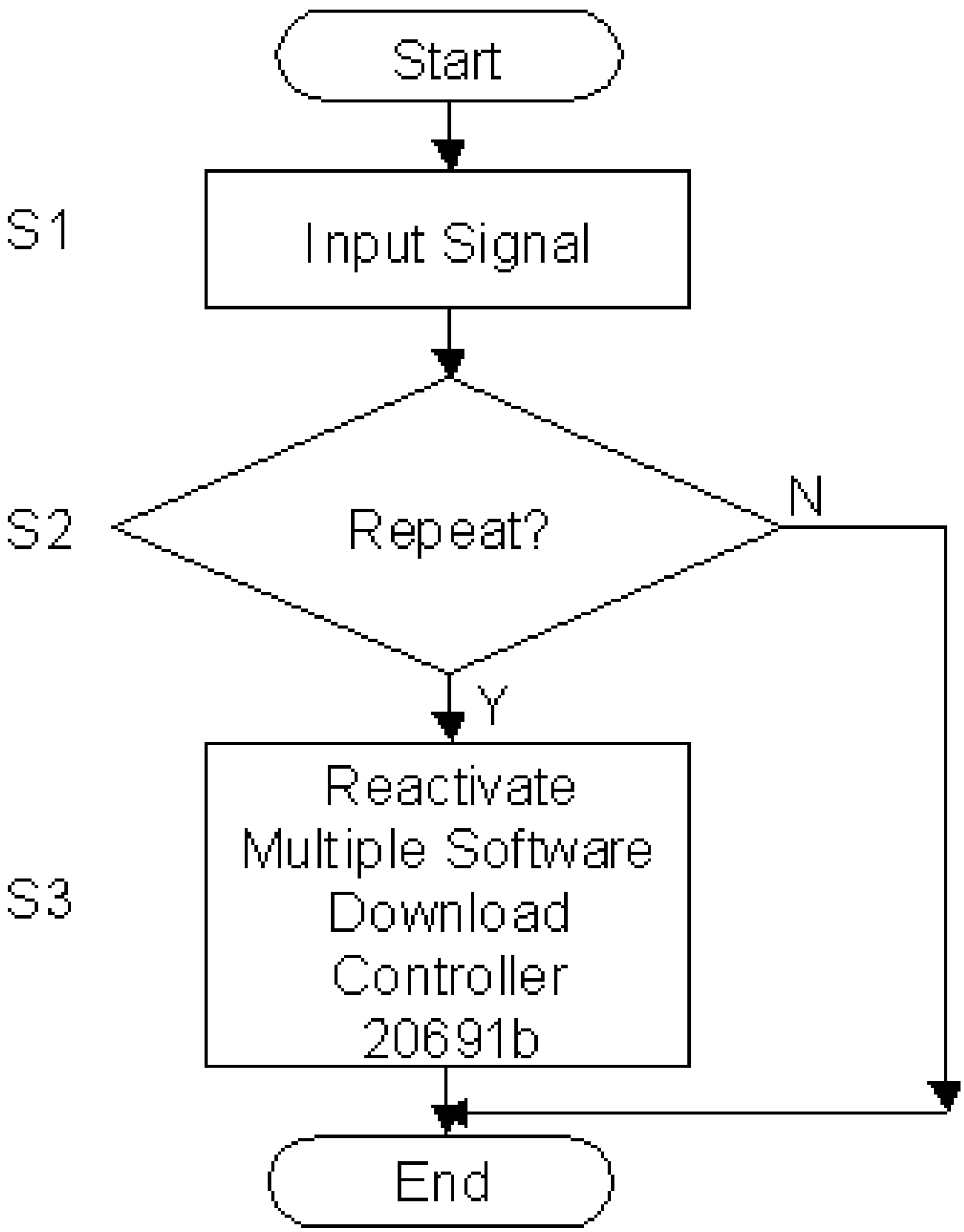

FIG. 406 is a flowchart illustrating an exemplary embodiment of the present invention.

Figure 407:
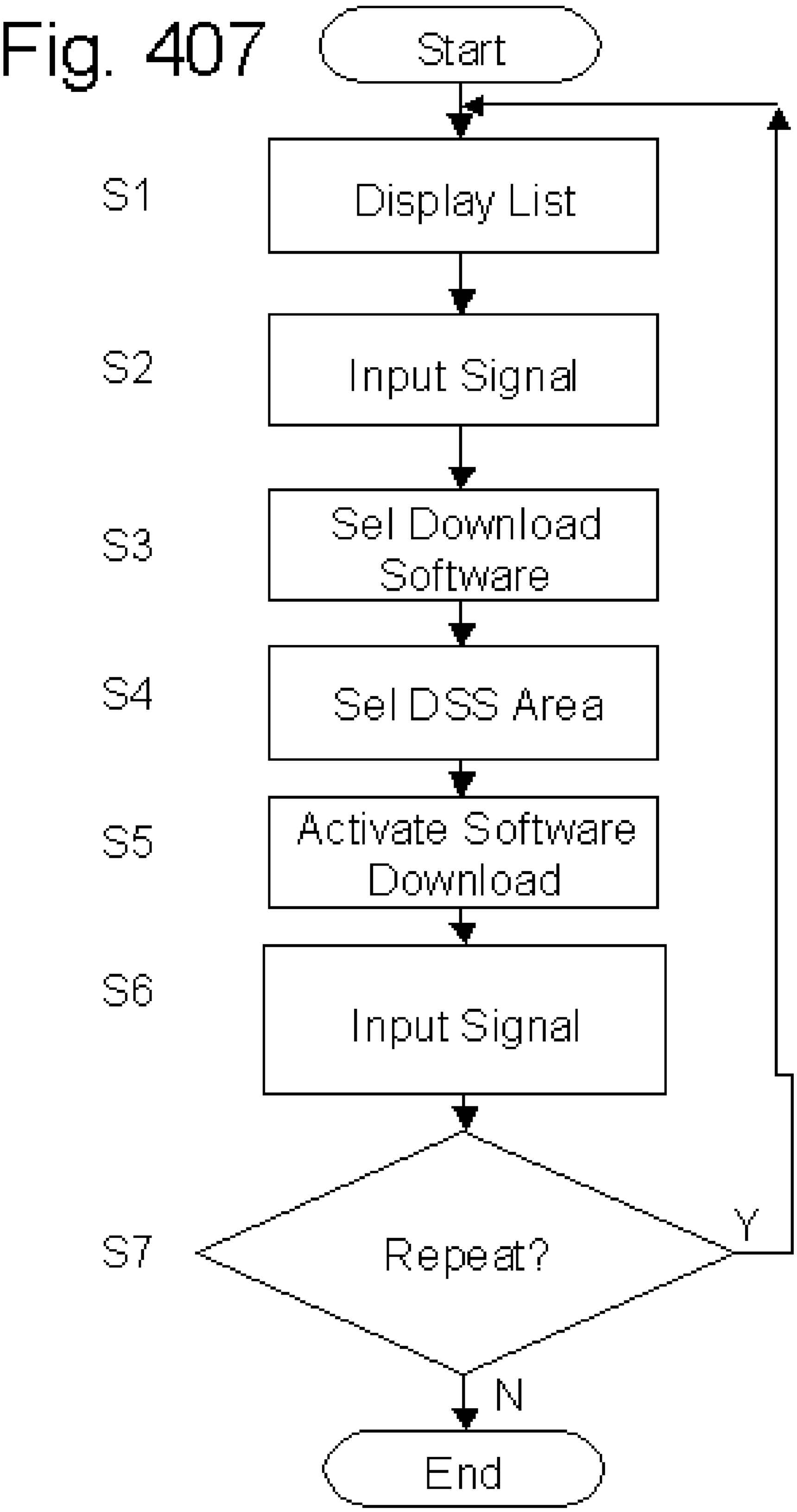

FIG. 407 is a flowchart illustrating an exemplary embodiment of the present invention.

Figure 408:
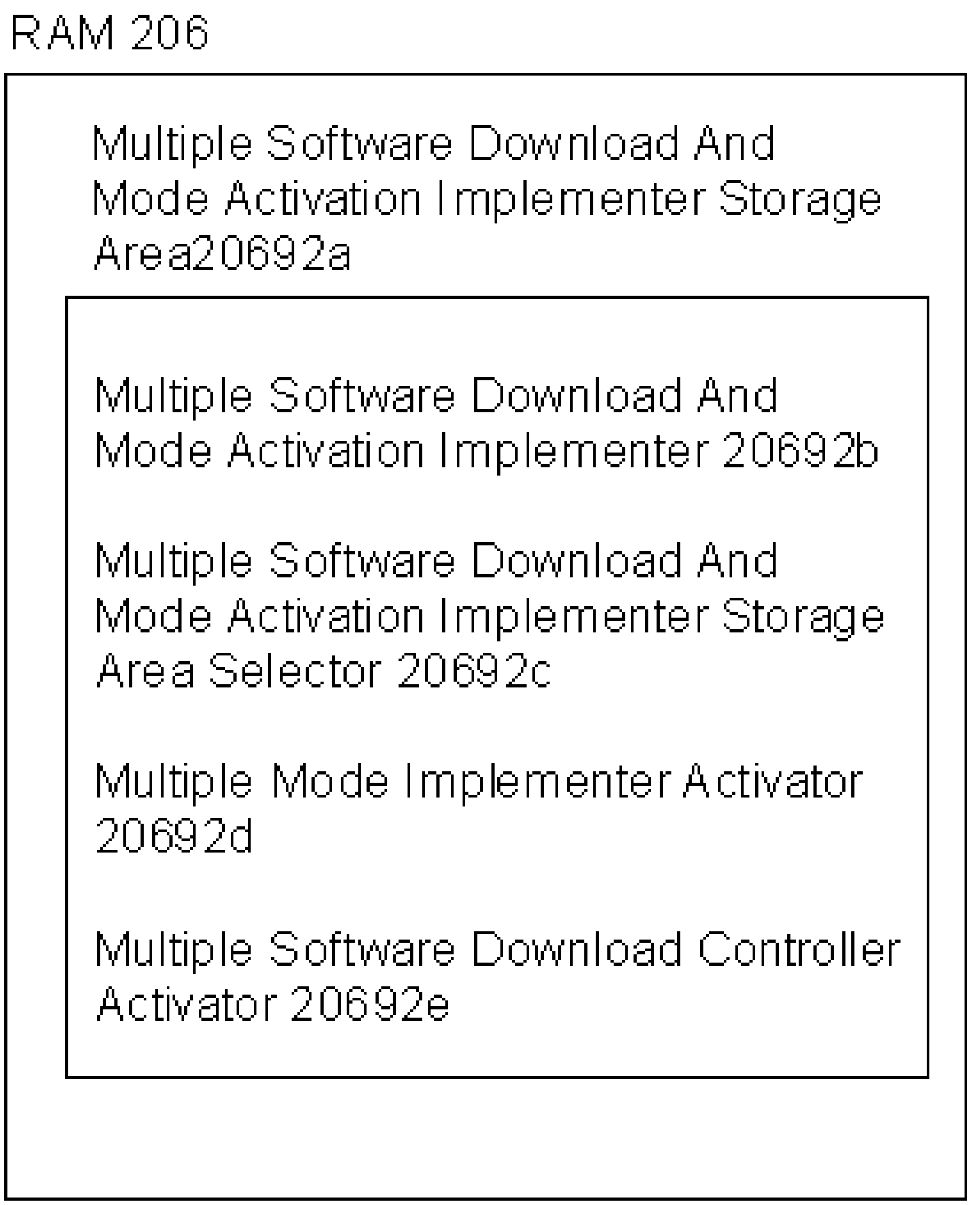

FIG. 408 is a block diagram illustrating an exemplary embodiment of the present invention.

Figure 409:
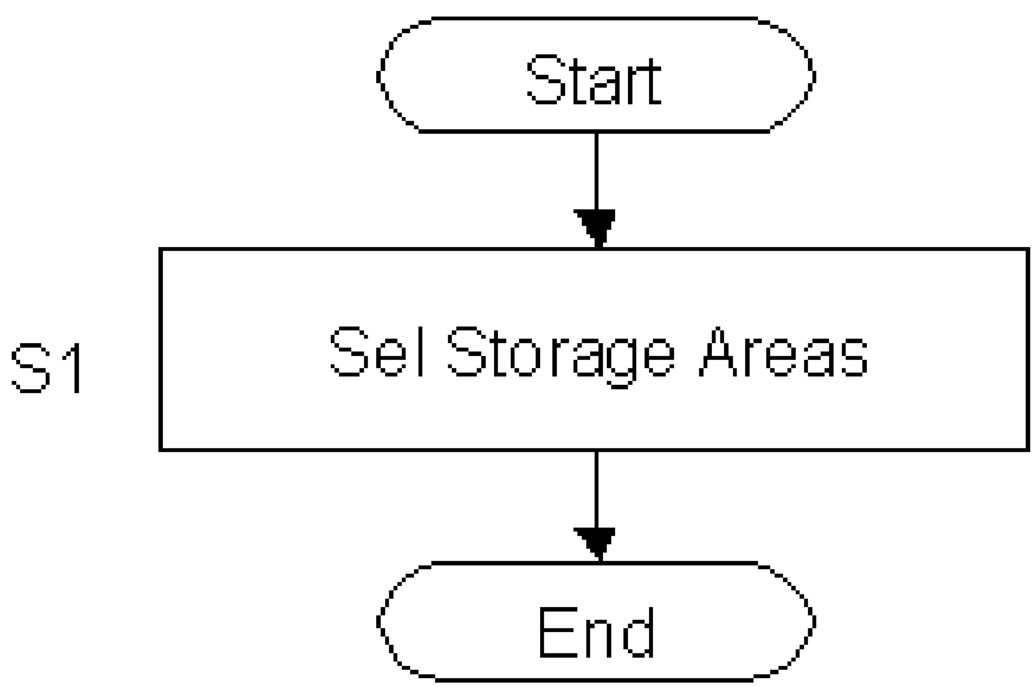

FIG. 409 is a flowchart illustrating an exemplary embodiment of the present invention.

Figure 410:
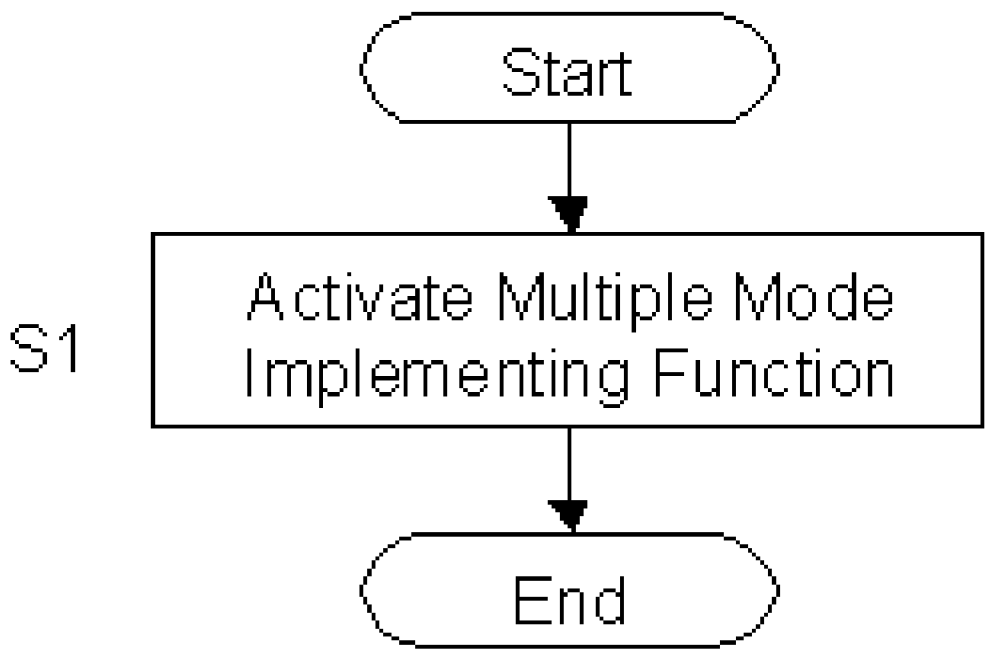

FIG. 410 is a flowchart illustrating an exemplary embodiment of the present invention.

Figure 411:
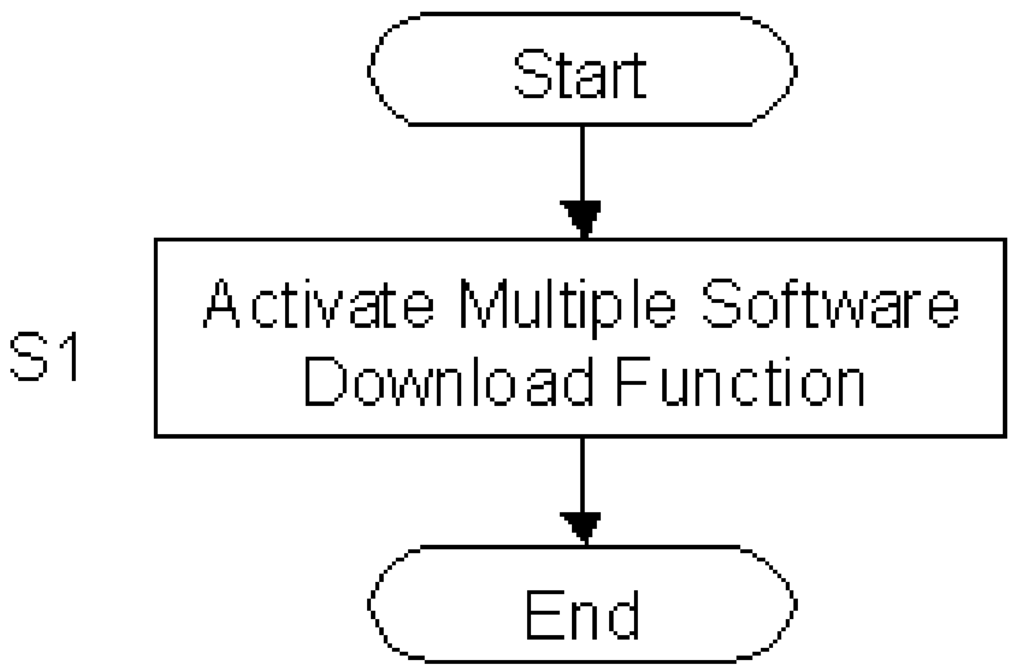

FIG. 411 is a flowchart illustrating an exemplary embodiment of the present invention.

Figure 412:
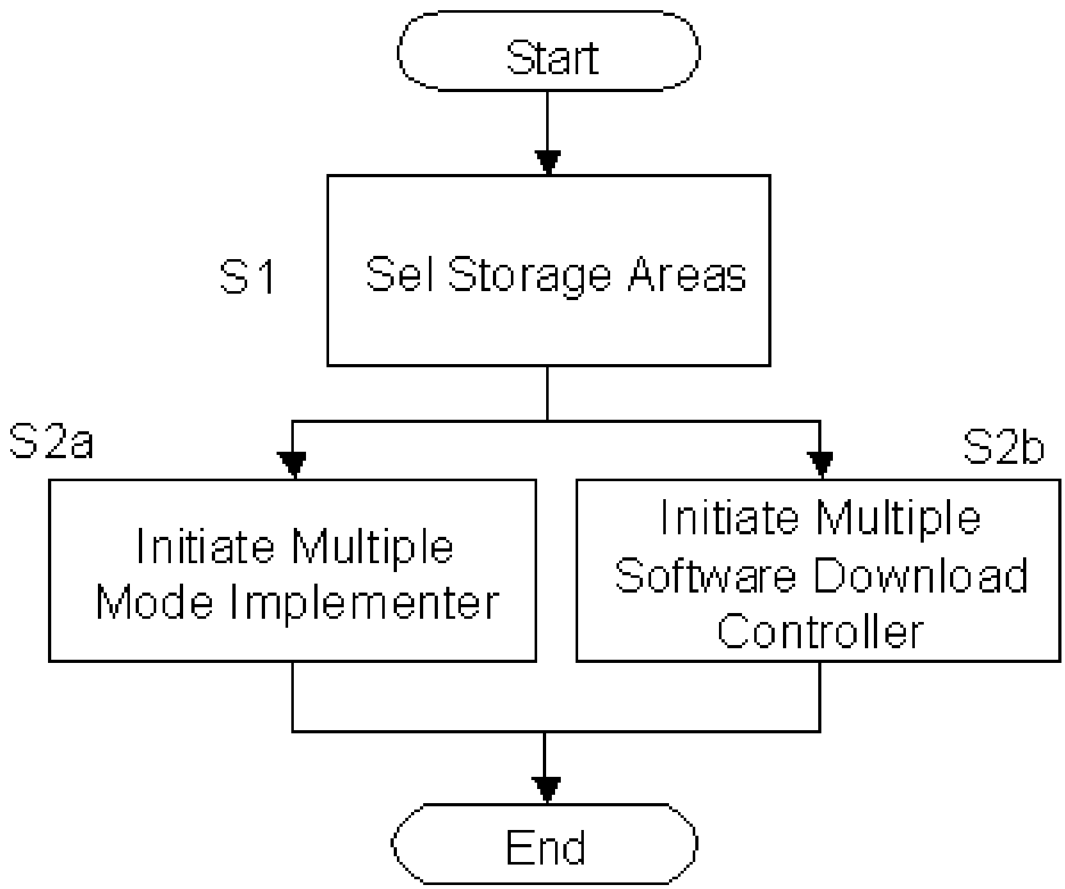

FIG. 412 is a flowchart illustrating an exemplary embodiment of the present invention.

Figure 413:
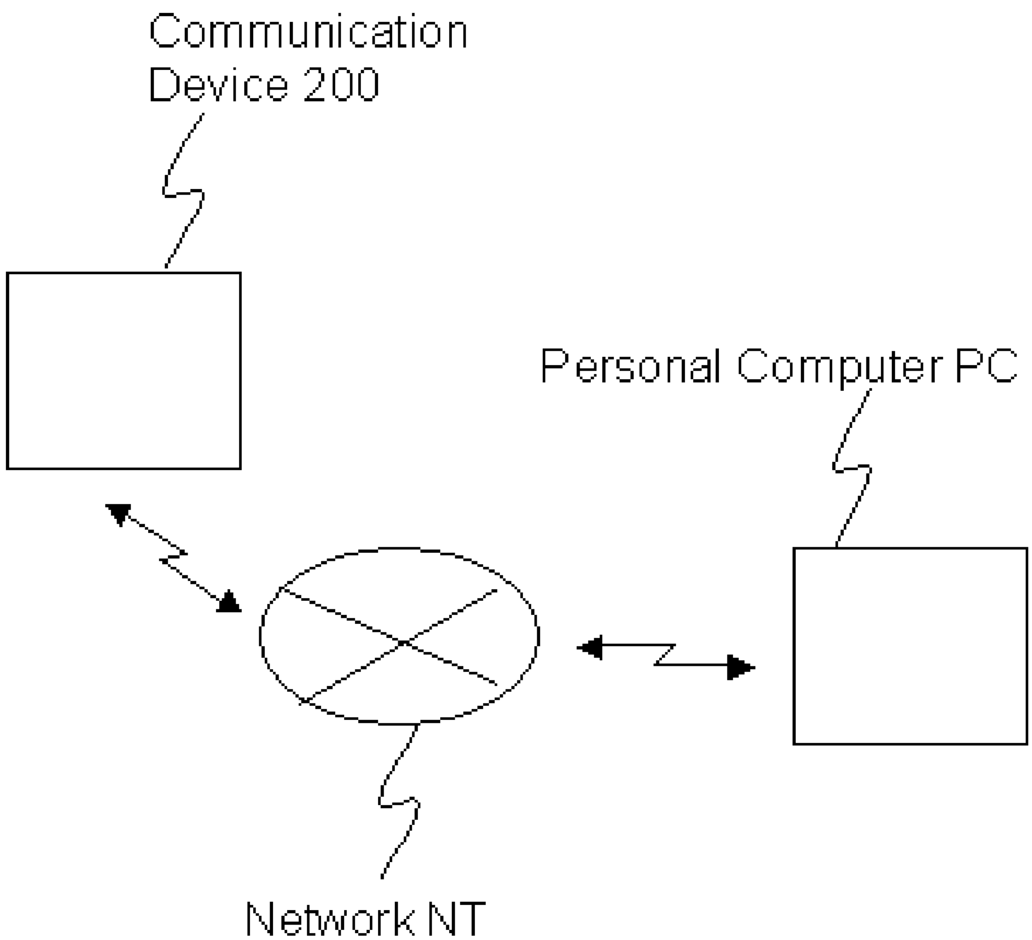

FIG. 413 is a simplified illustration illustrating an exemplary embodiment of the present invention.

Figure 414:
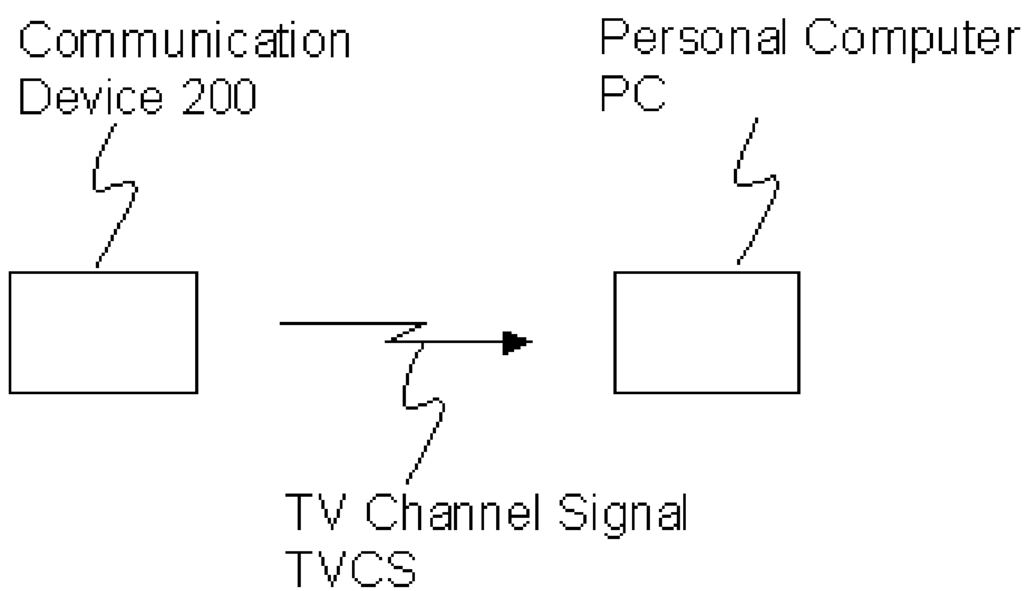

FIG. 414 is a simplified illustration illustrating an exemplary embodiment of the present invention.

Figure 415:
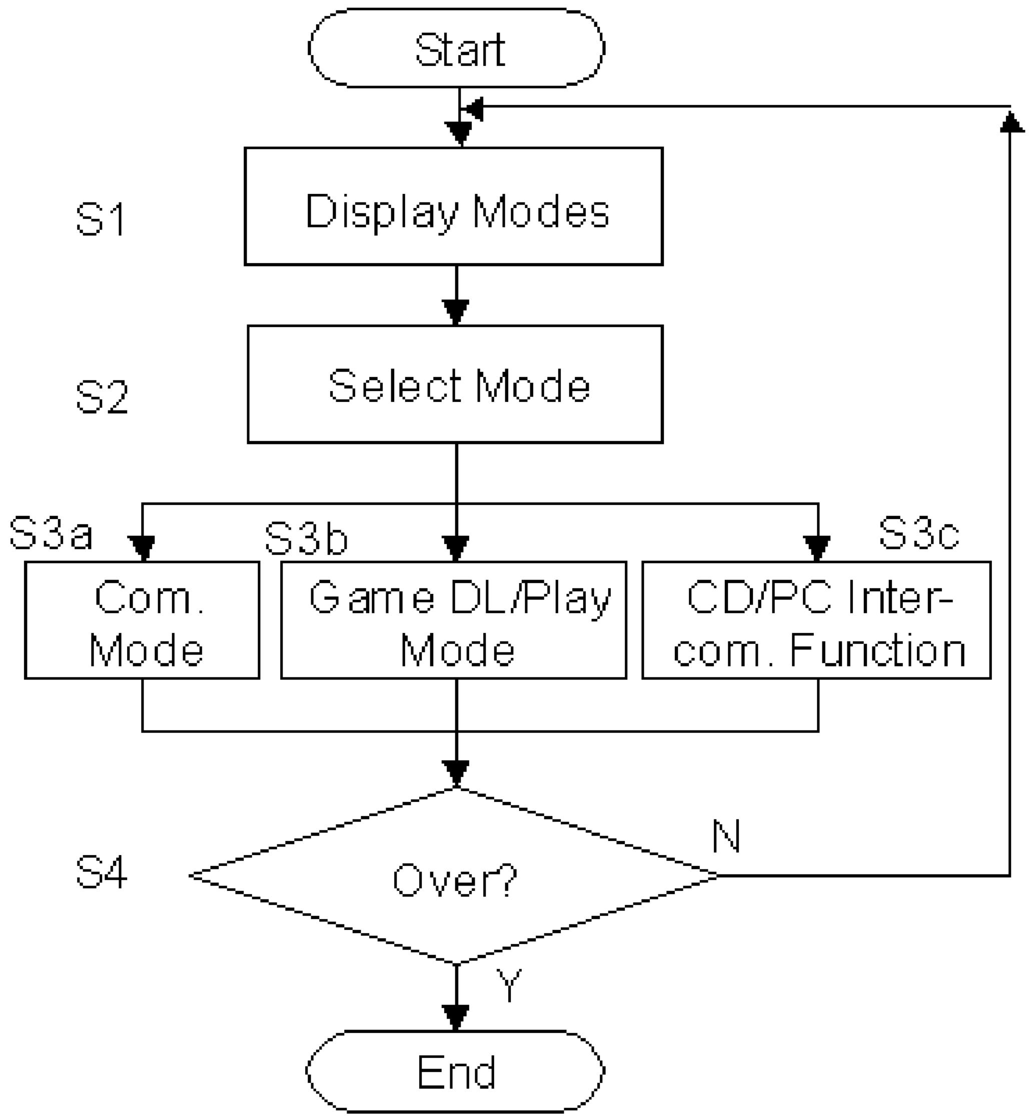

FIG. 415 is a flowchart illustrating an exemplary embodiment of the present invention.

Figure 416:
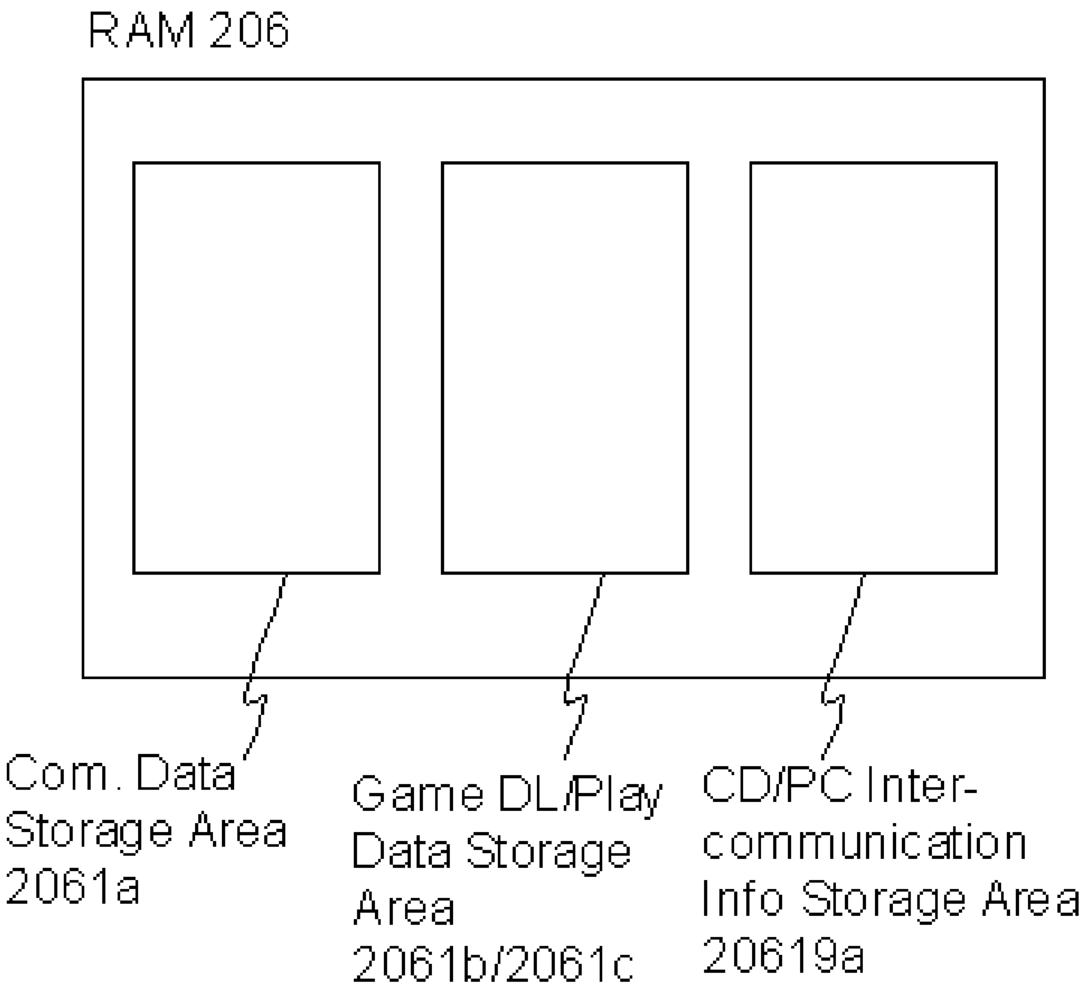

FIG. 416 is a block diagram illustrating an exemplary embodiment of the present invention.

Figure 417:
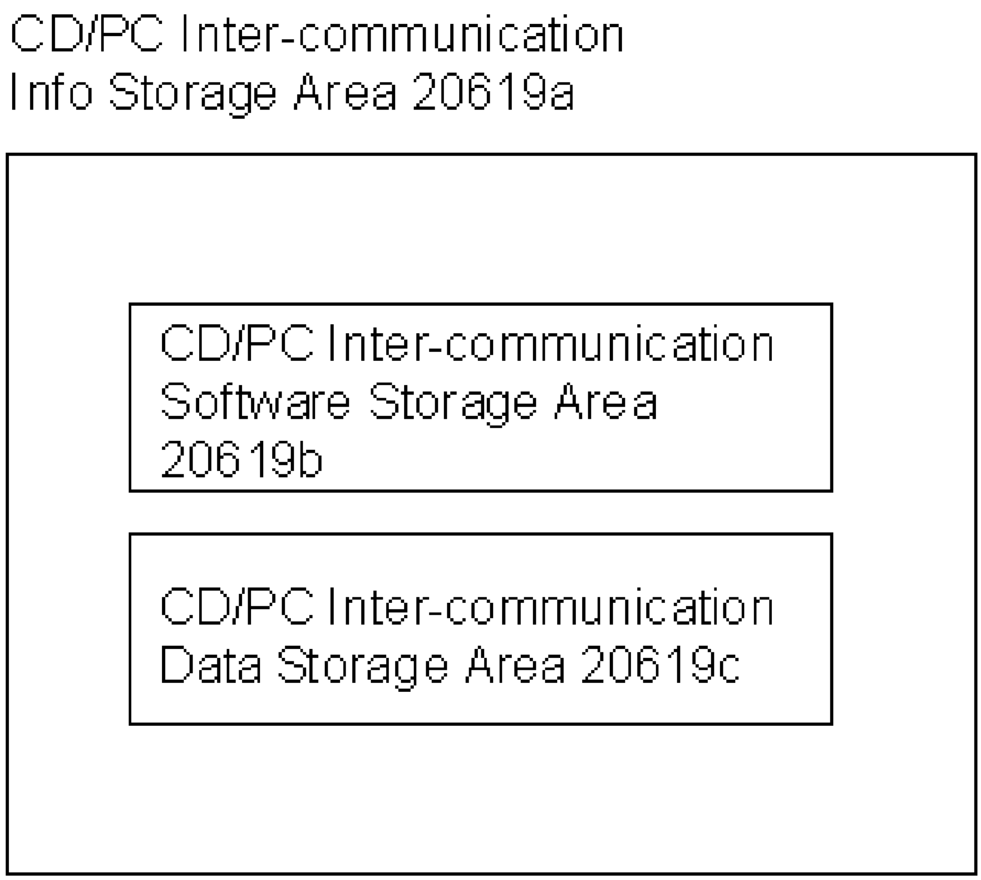

FIG. 417 is a block diagram illustrating an exemplary embodiment of the present invention.

Figure 418:
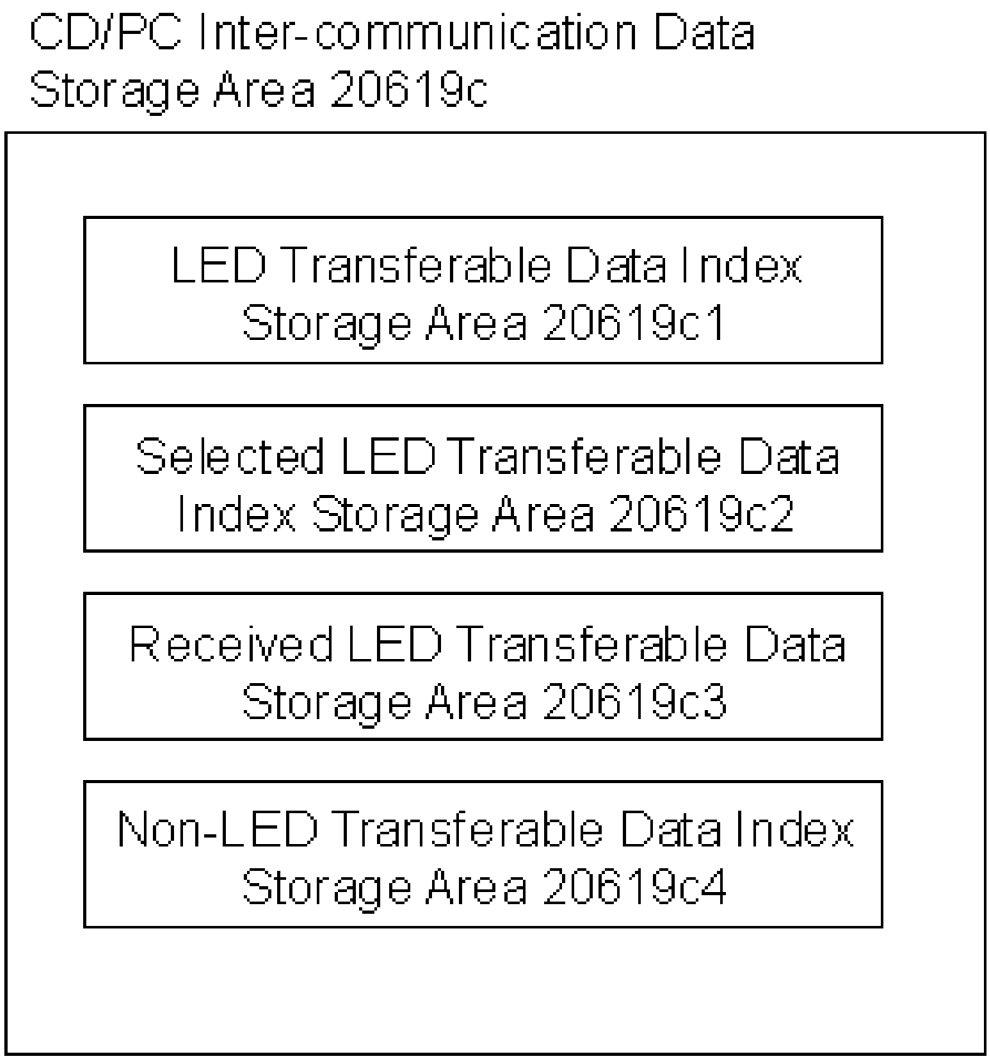

FIG. 418 is a block diagram illustrating an exemplary embodiment of the present invention.

Figure 419:
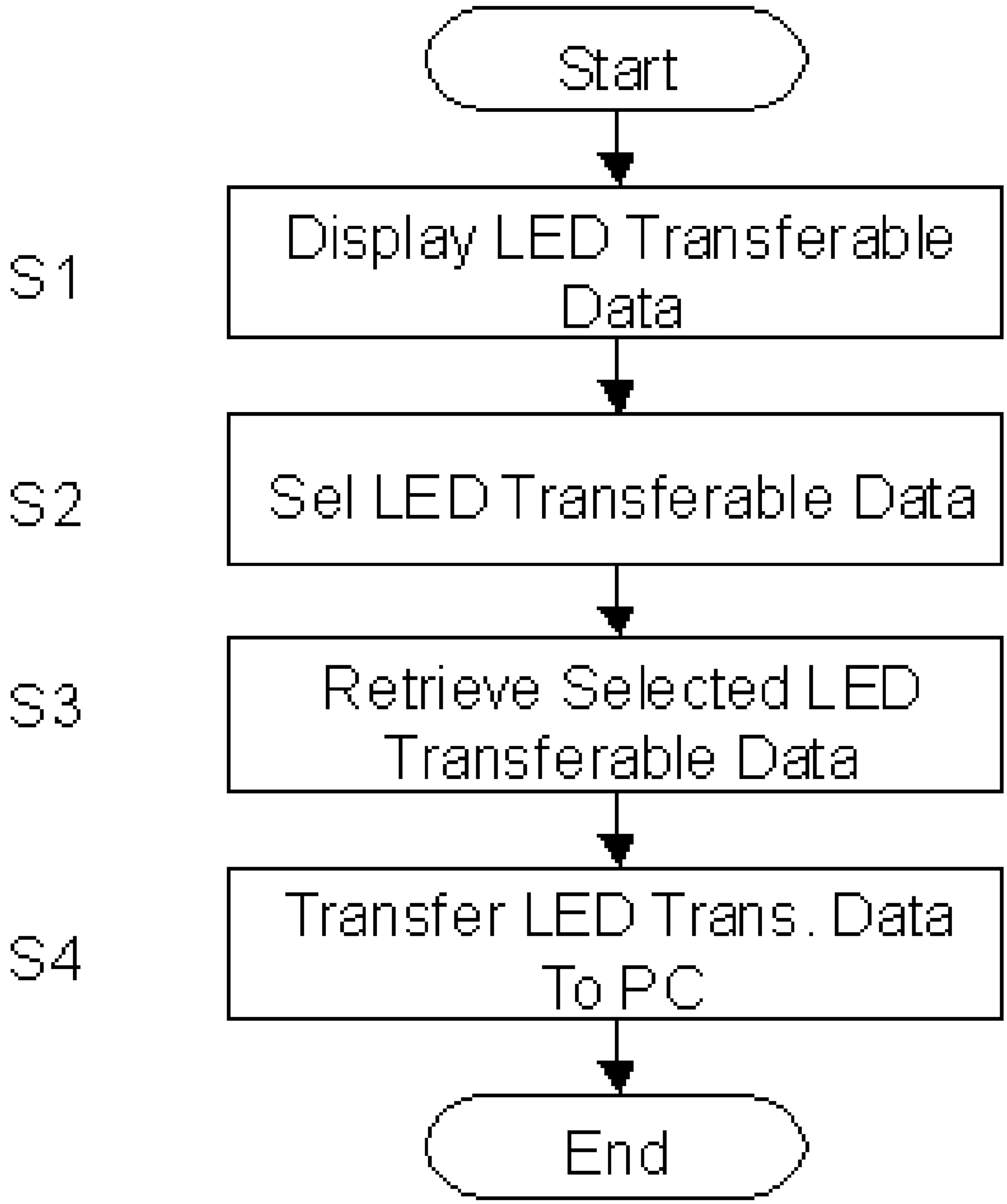

FIG. 419 is a flowchart illustrating an exemplary embodiment of the present invention.

Figure 420:
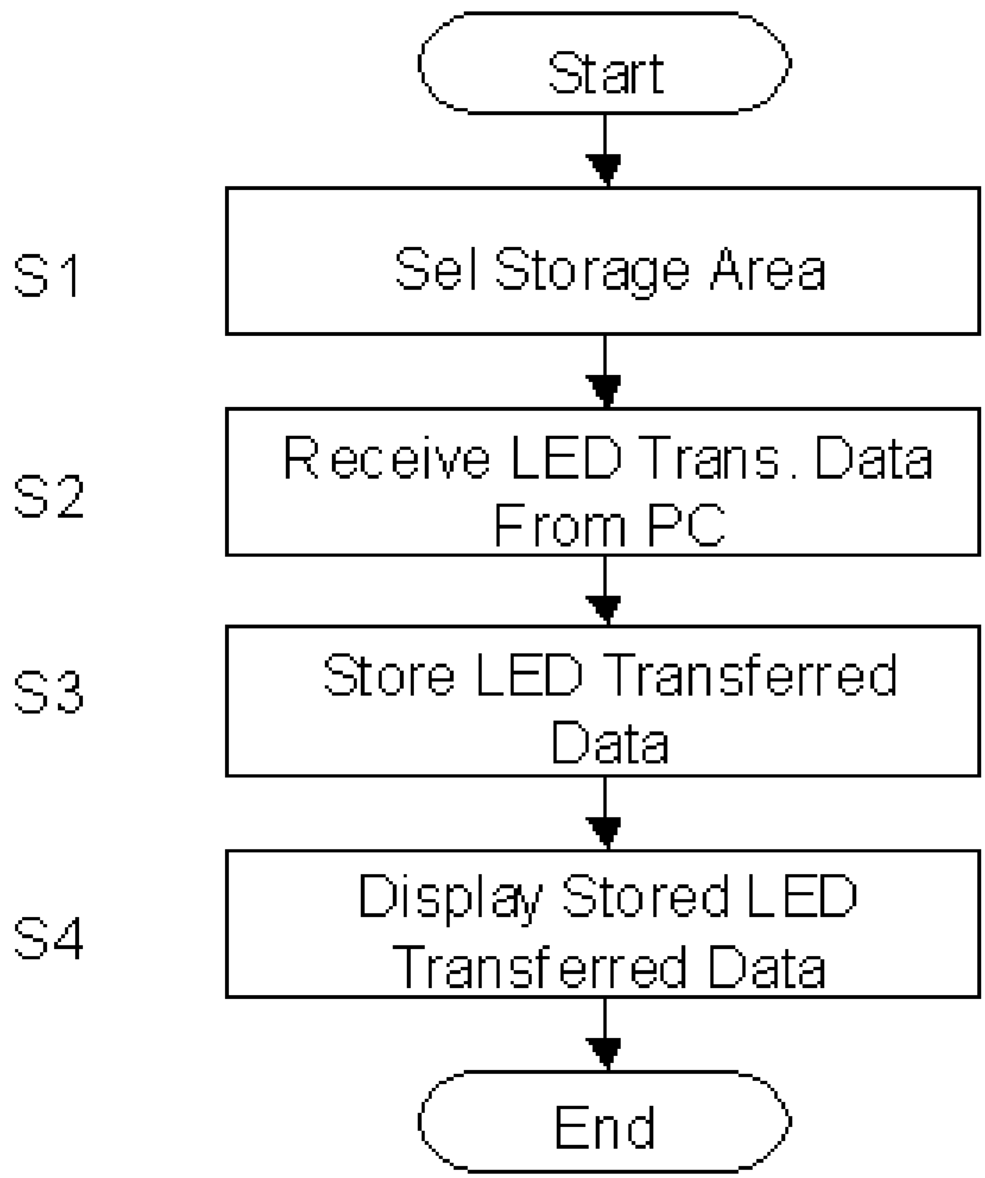

FIG. 420 is a flowchart illustrating an exemplary embodiment of the present invention.

Figure 421:
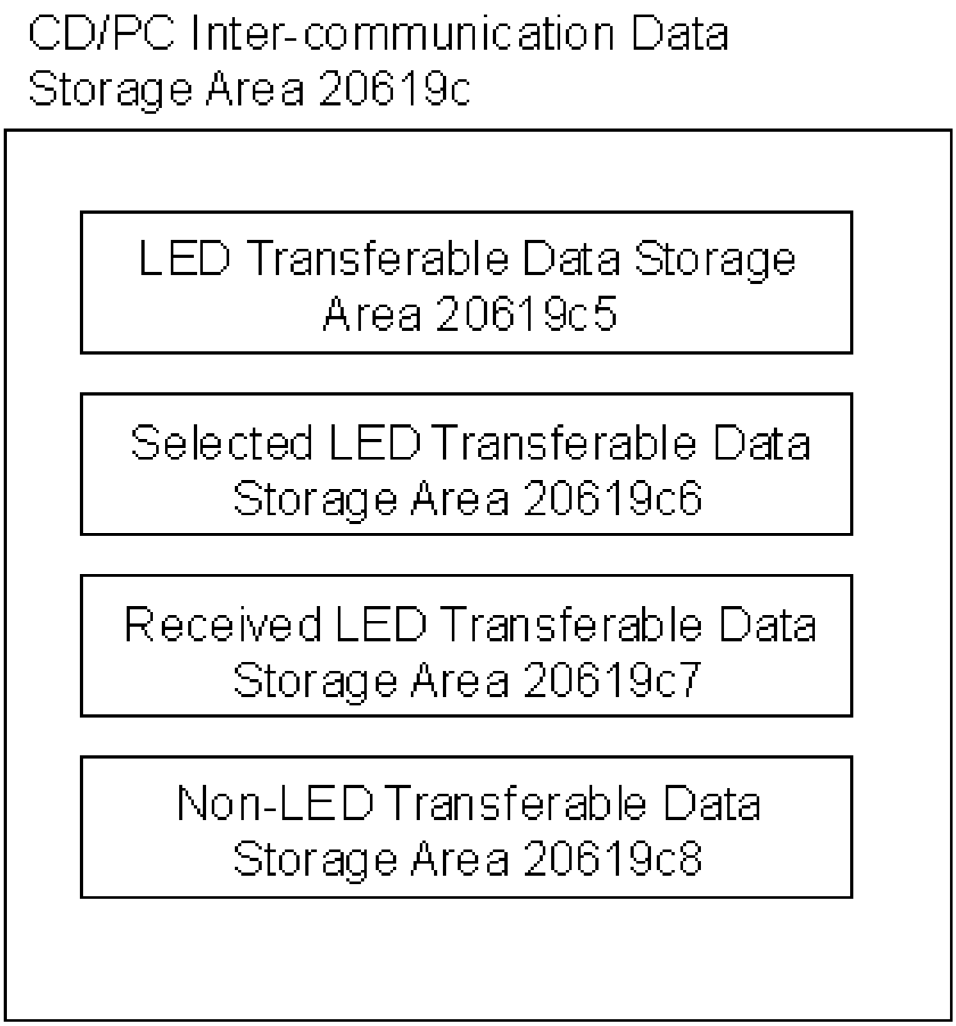

FIG. 421 is a block diagram illustrating an exemplary embodiment of the present invention.

Figure 422:
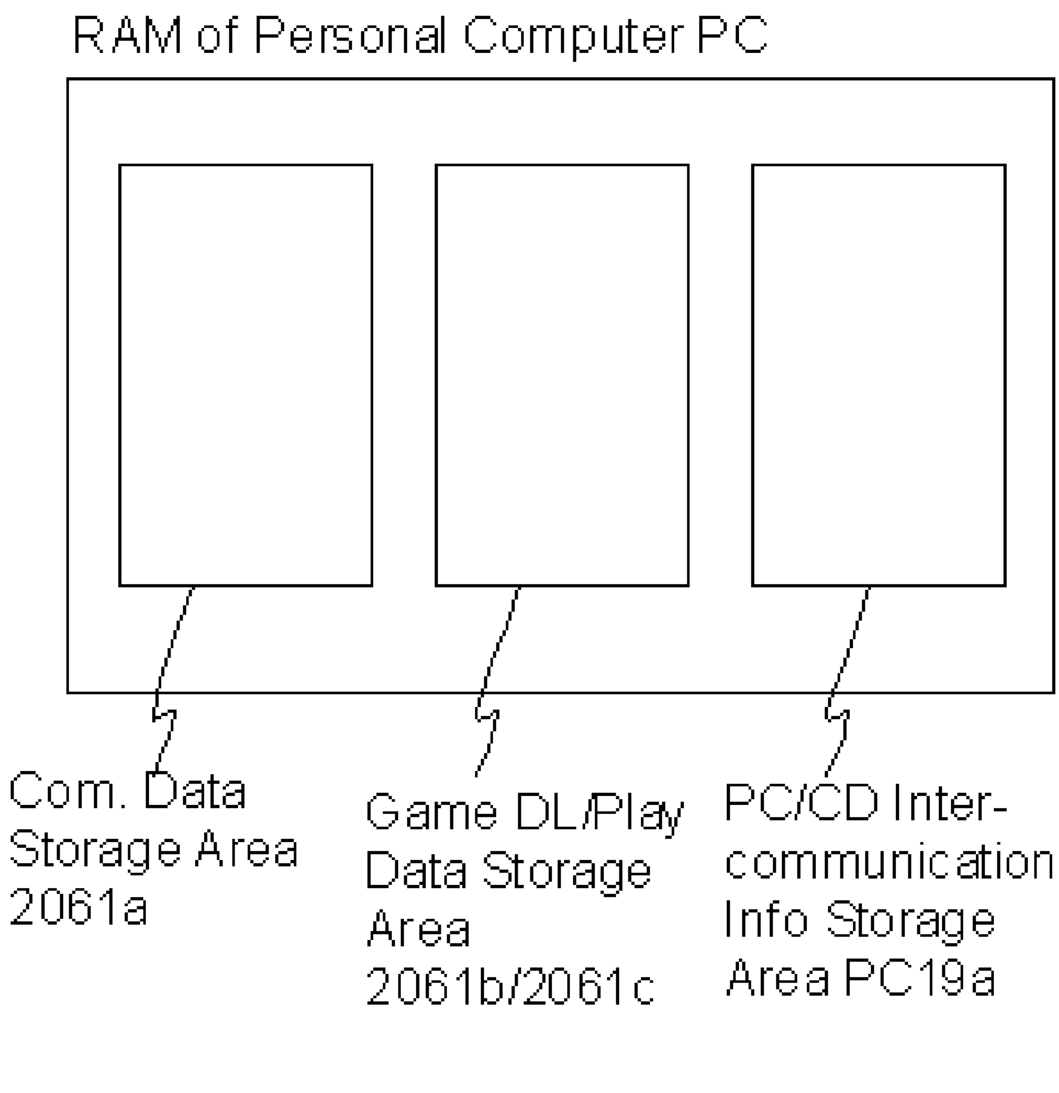

FIG. 422 is a block diagram illustrating an exemplary embodiment of the present invention.

Figure 423:
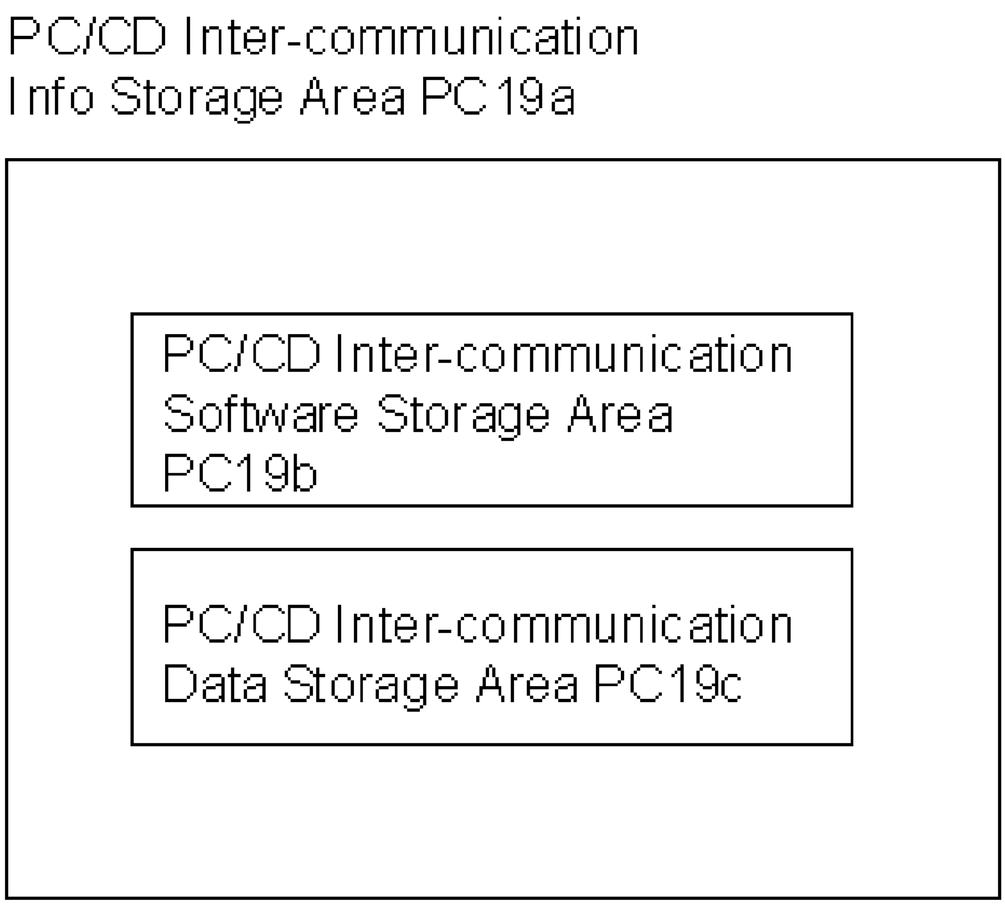

FIG. 423 is a block diagram illustrating an exemplary embodiment of the present invention.

Figure 424:
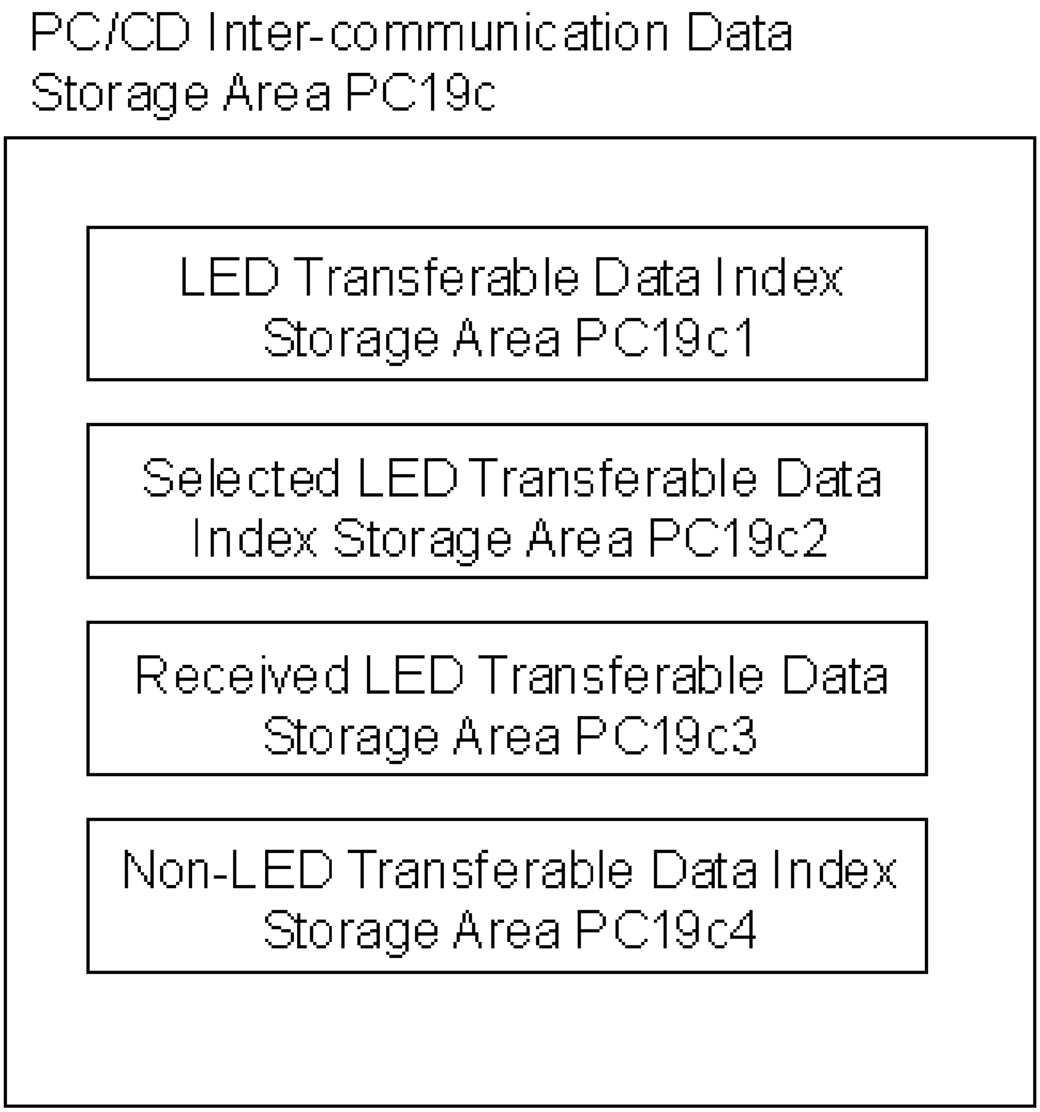

FIG. 424 is a block diagram illustrating an exemplary embodiment of the present invention.

Figure 425:
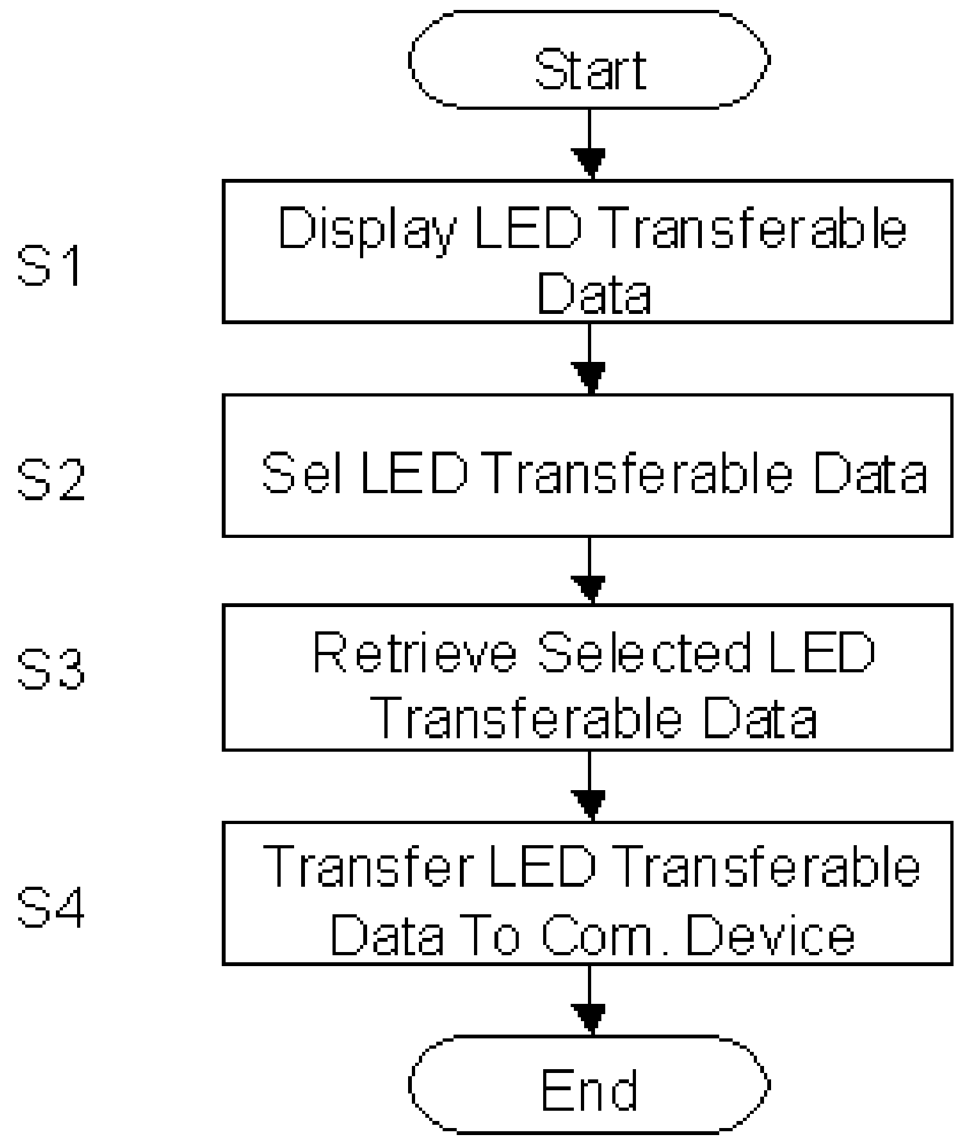

FIG. 425 is a flowchart illustrating an exemplary embodiment of the present invention.

Figure 426:
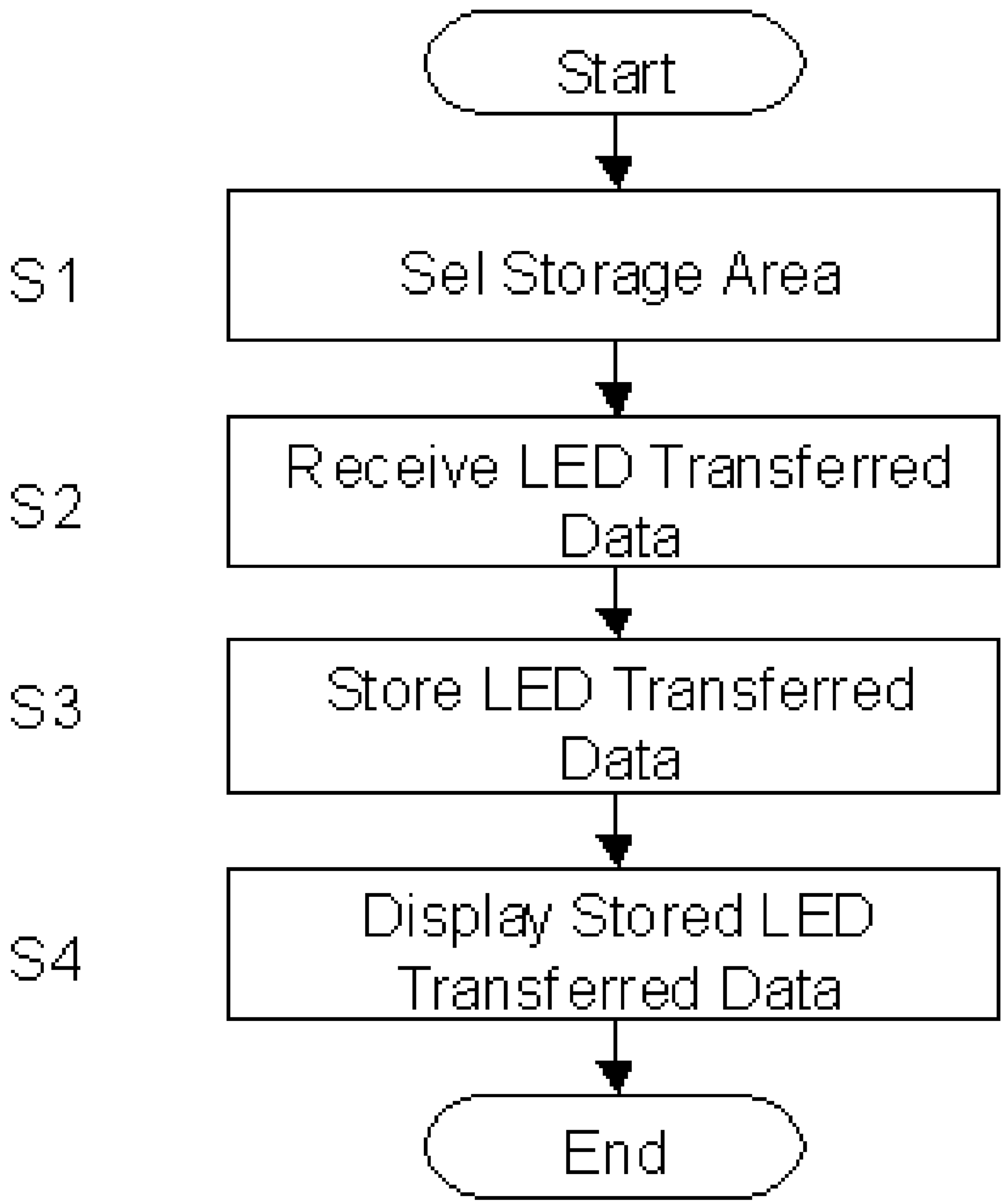

FIG. 426 is a flowchart illustrating an exemplary embodiment of the present invention.

Figure 427:
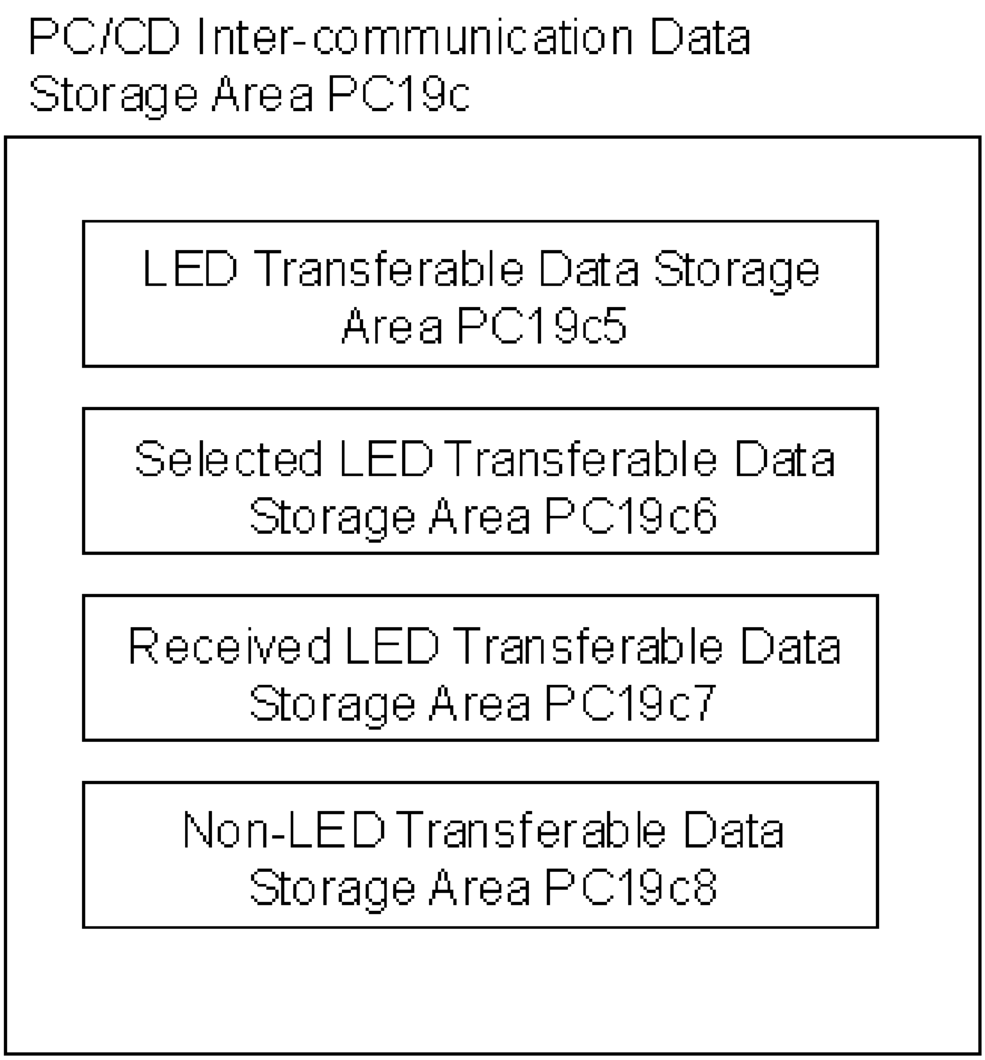

FIG. 427 is a block diagram illustrating an exemplary embodiment of the present invention.

Figure 428:
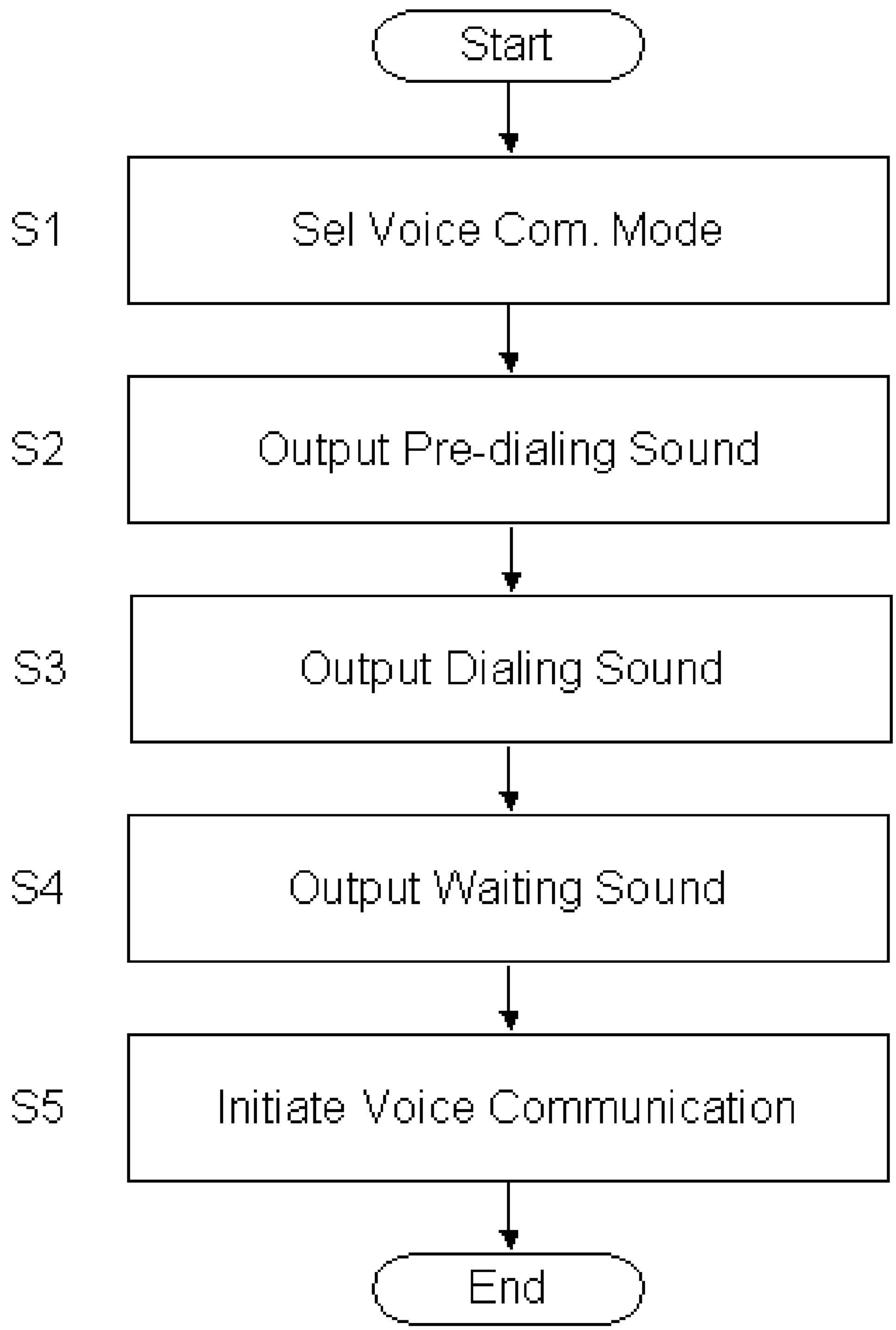

FIG. 428 is a simplified illustration illustrating an exemplary embodiment of the present invention.

Figure 429:
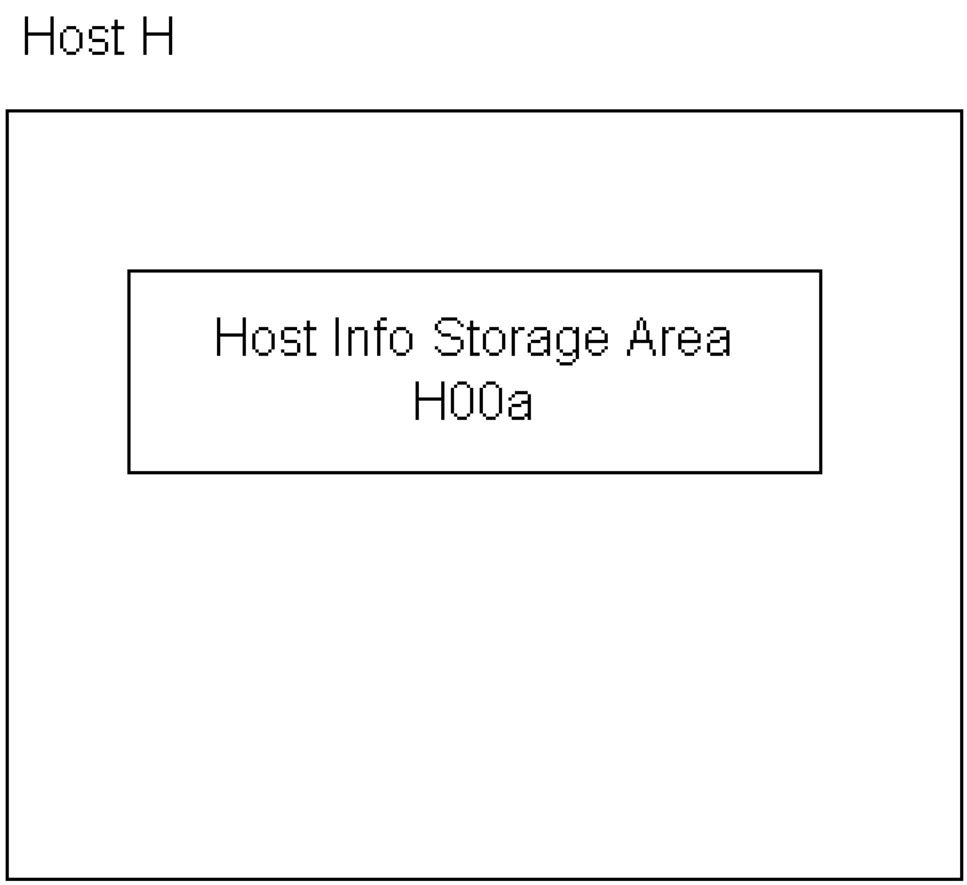

FIG. 429 is a block diagram illustrating an exemplary embodiment of the present invention.

Figure 430:
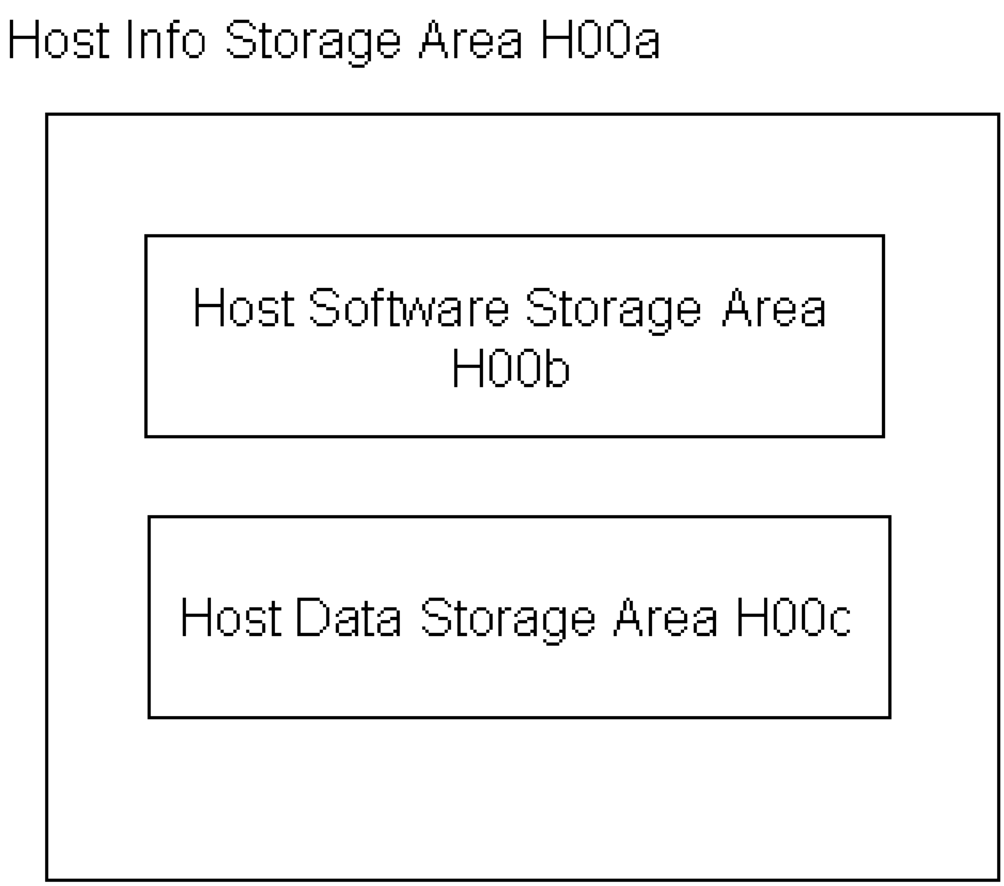

FIG. 430 is a block diagram illustrating an exemplary embodiment of the present invention.

Figure 431:
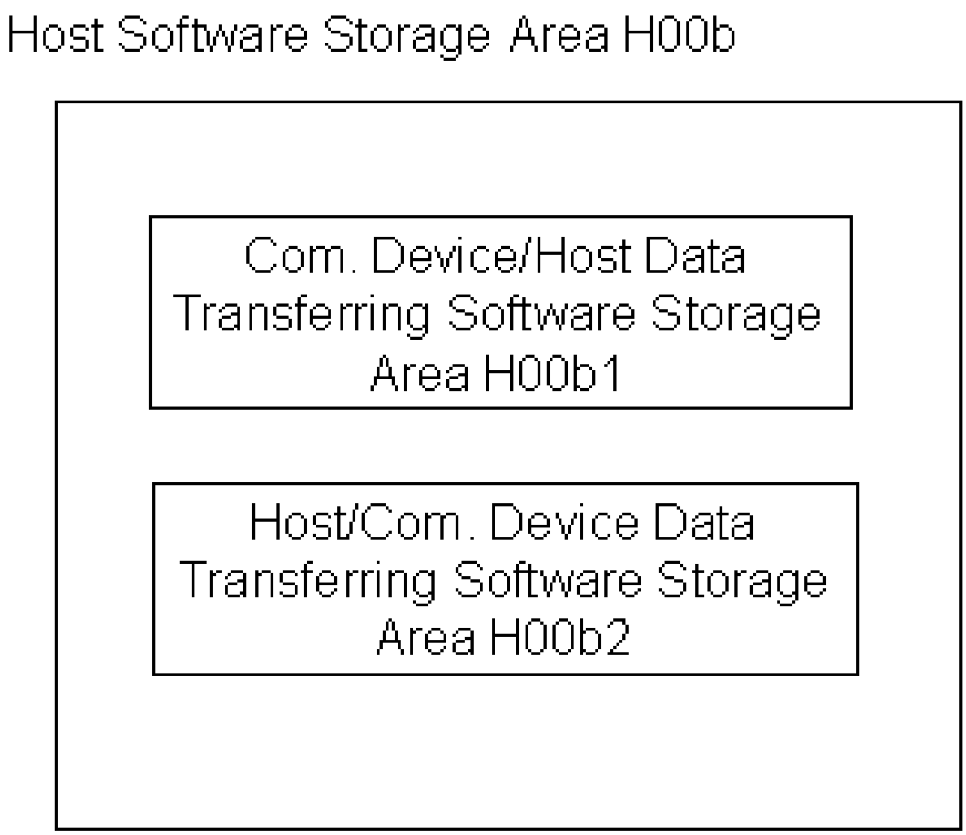

FIG. 431 is a block diagram illustrating an exemplary embodiment of the present invention.

Figure 432:
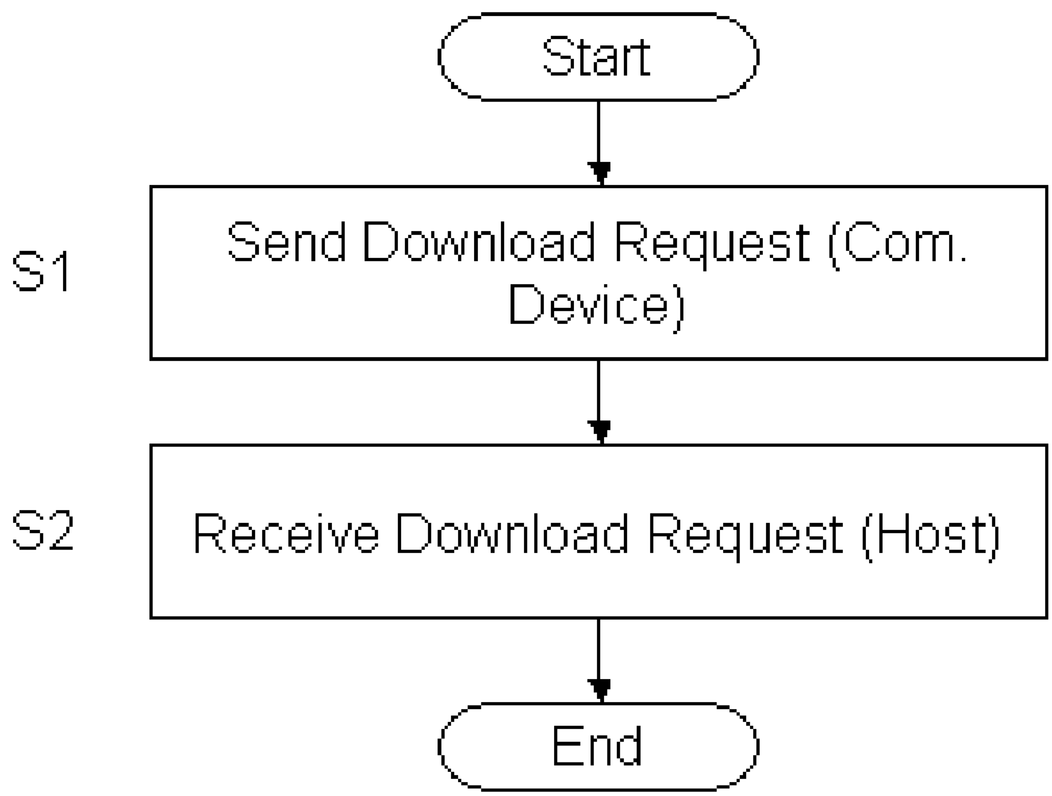

FIG. 432 is a flowchart illustrating an exemplary embodiment of the present invention.

Figure 433:
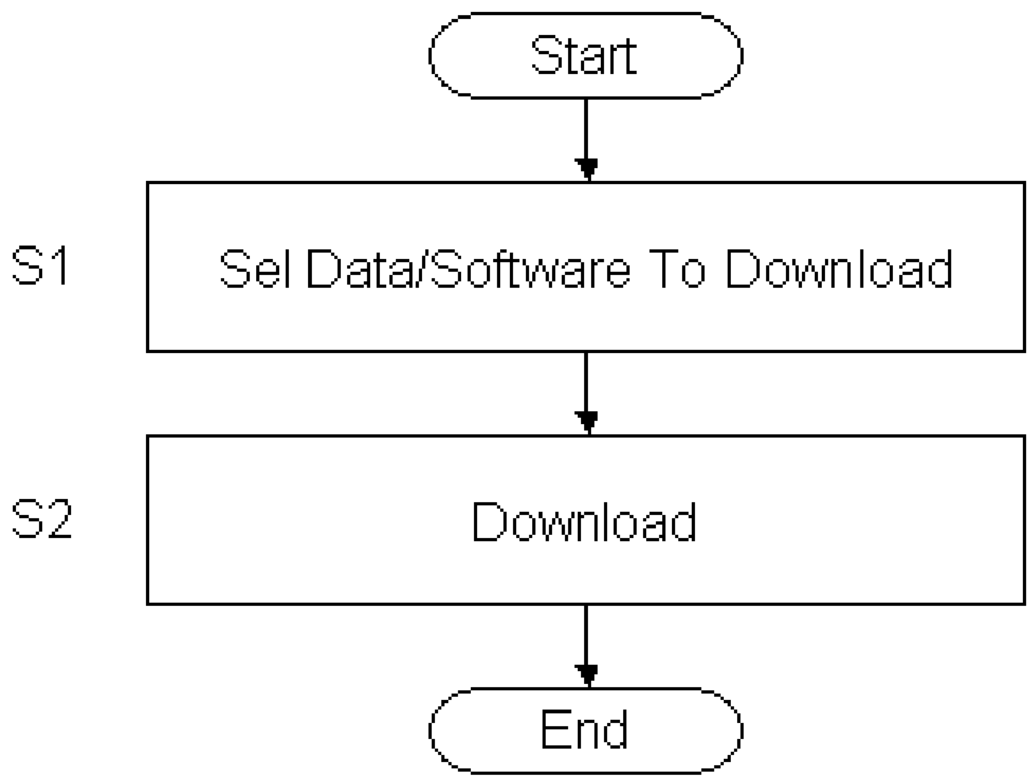

FIG. 433 is a flowchart illustrating an exemplary embodiment of the present invention.

Figure 434:
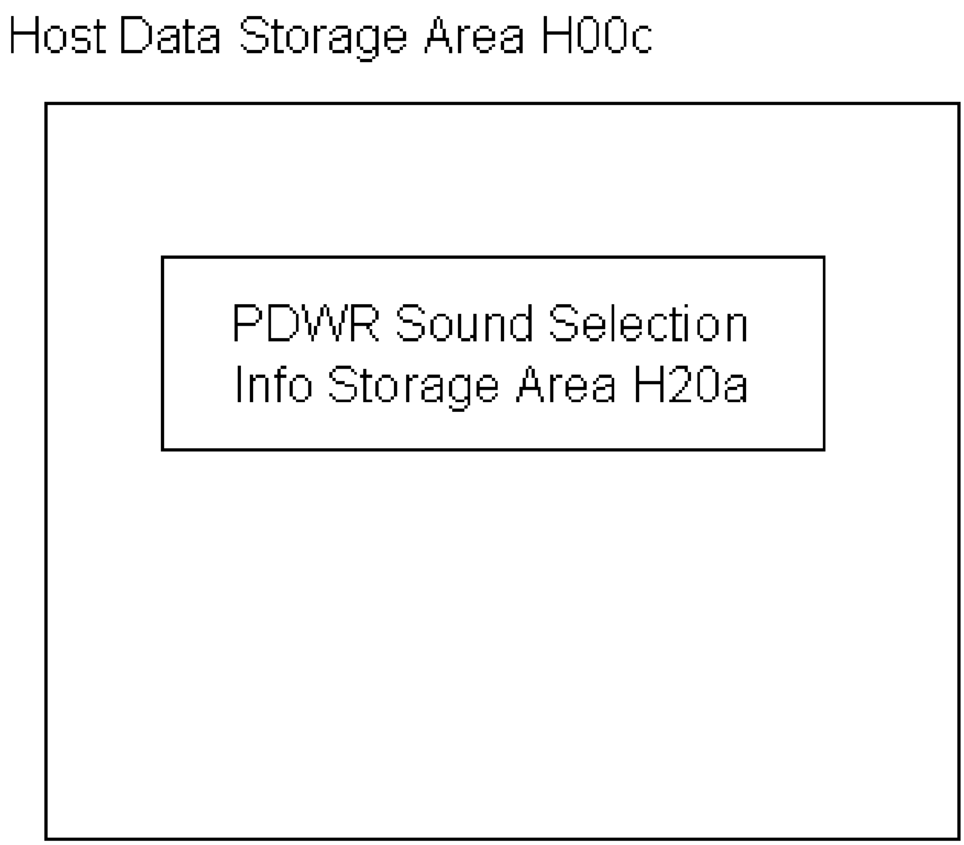

FIG. 434 is a block diagram illustrating an exemplary embodiment of the present invention.

Figure 435:
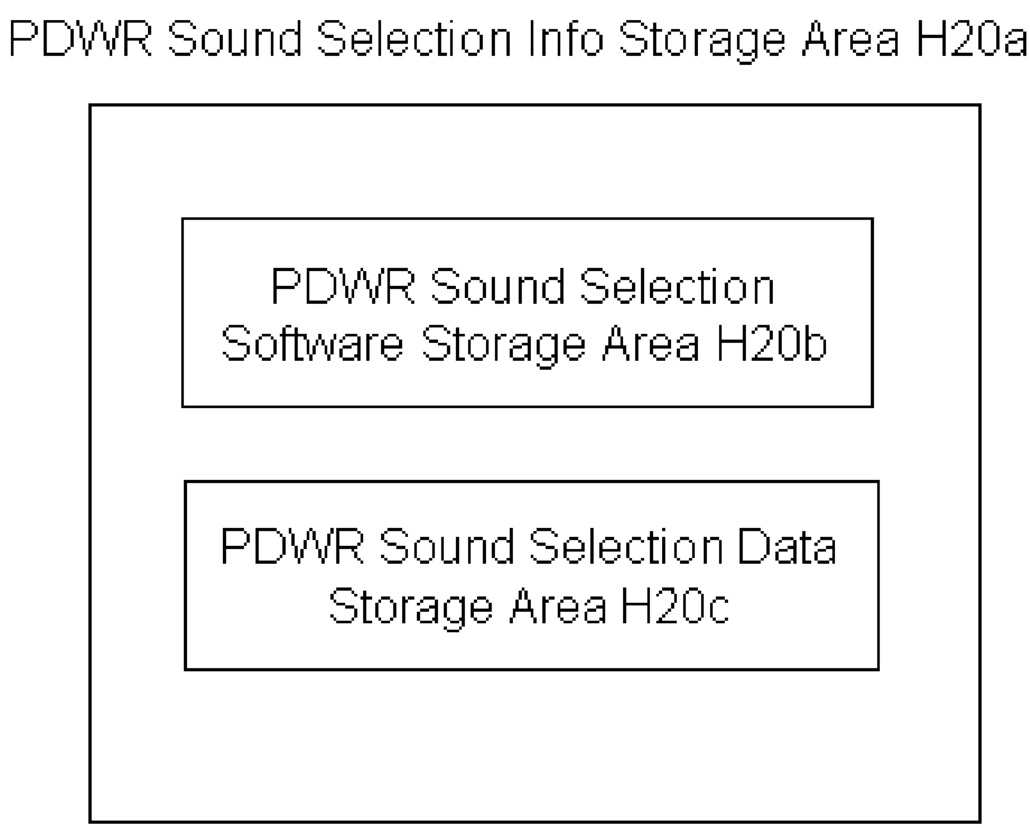

FIG. 435 is a block diagram illustrating an exemplary embodiment of the present invention.

Figure 436:
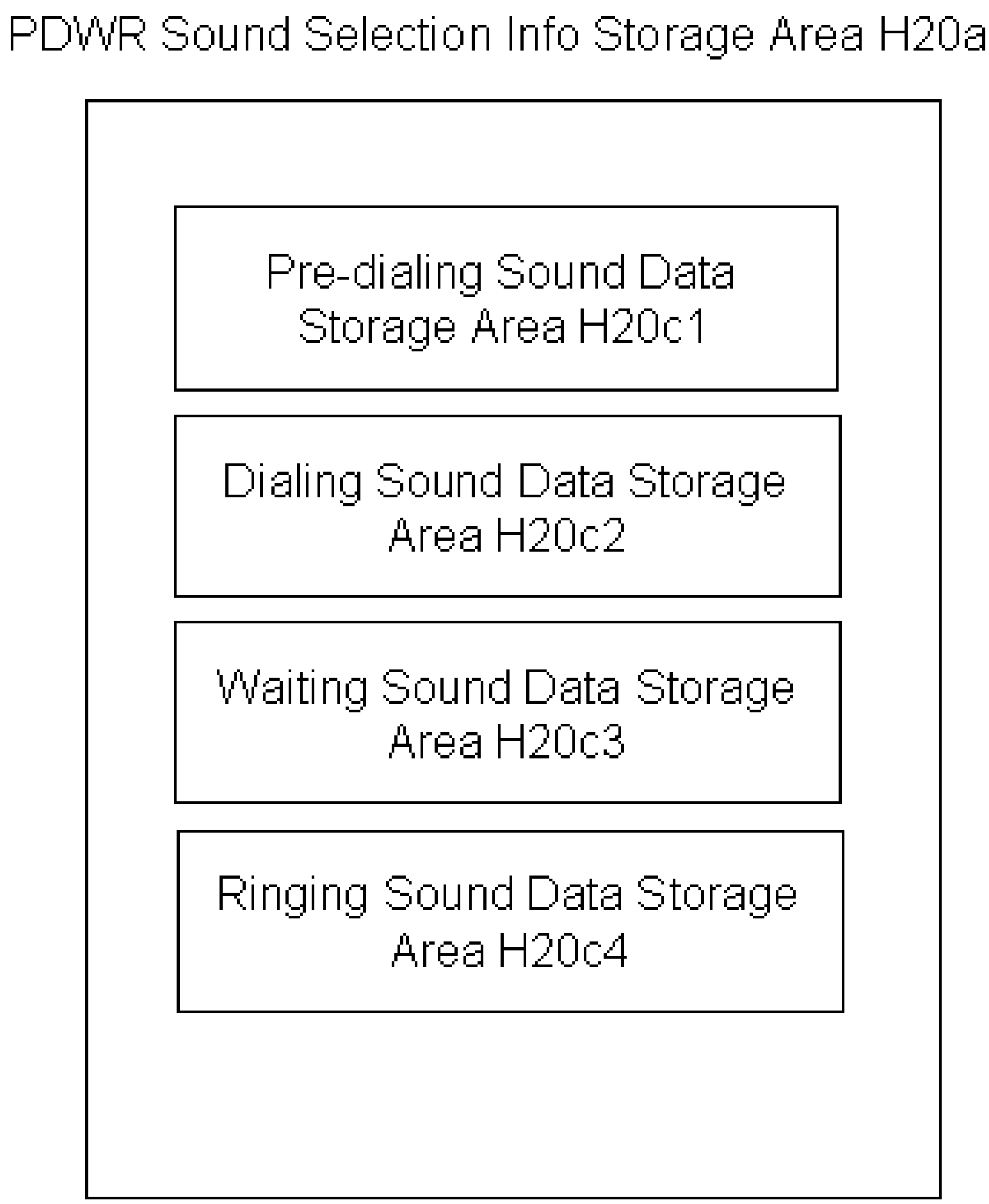

FIG. 436 is a block diagram illustrating an exemplary embodiment of the present invention.

Figure 437:
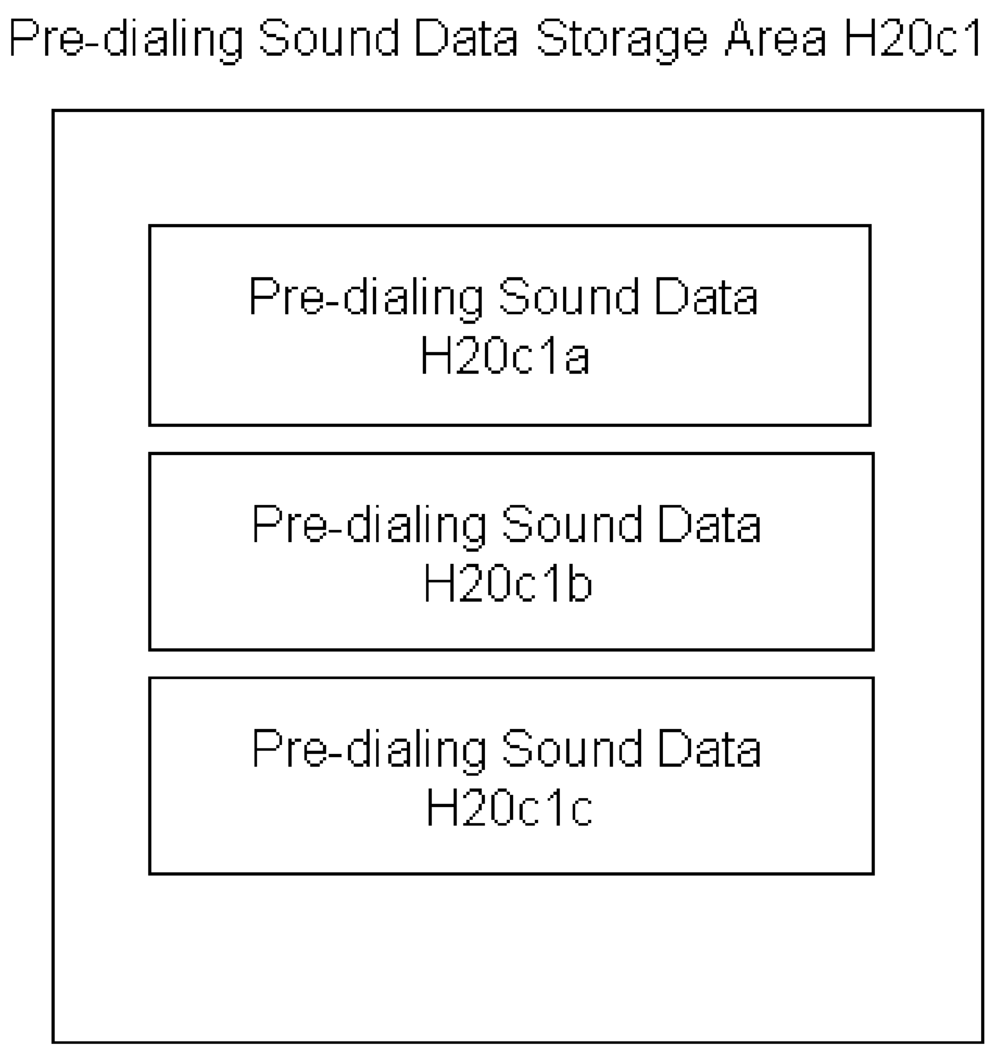

FIG. 437 is a block diagram illustrating an exemplary embodiment of the present invention.

Figure 438:
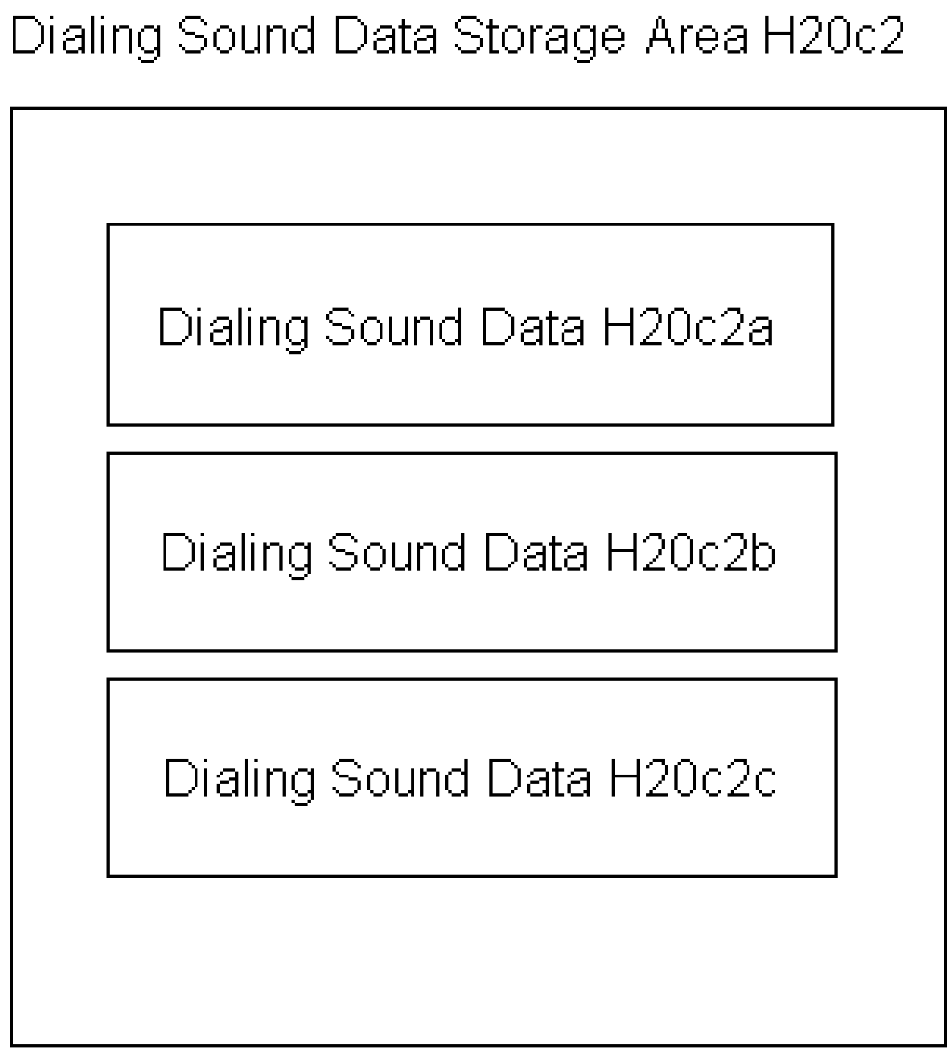

FIG. 438 is a block diagram illustrating an exemplary embodiment of the present invention.

Figure 439:
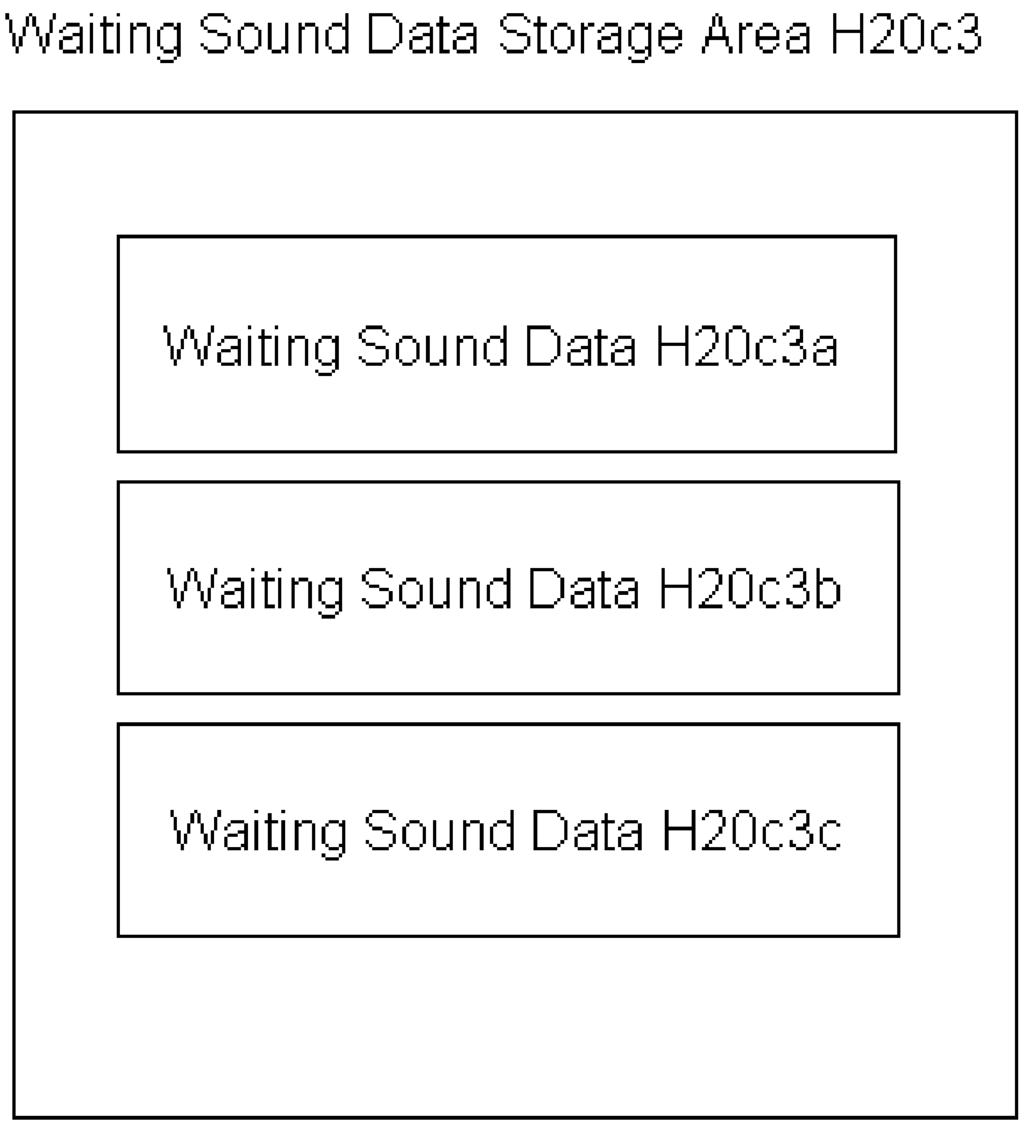

FIG. 439 is a block diagram illustrating an exemplary embodiment of the present invention.

Figure 440:
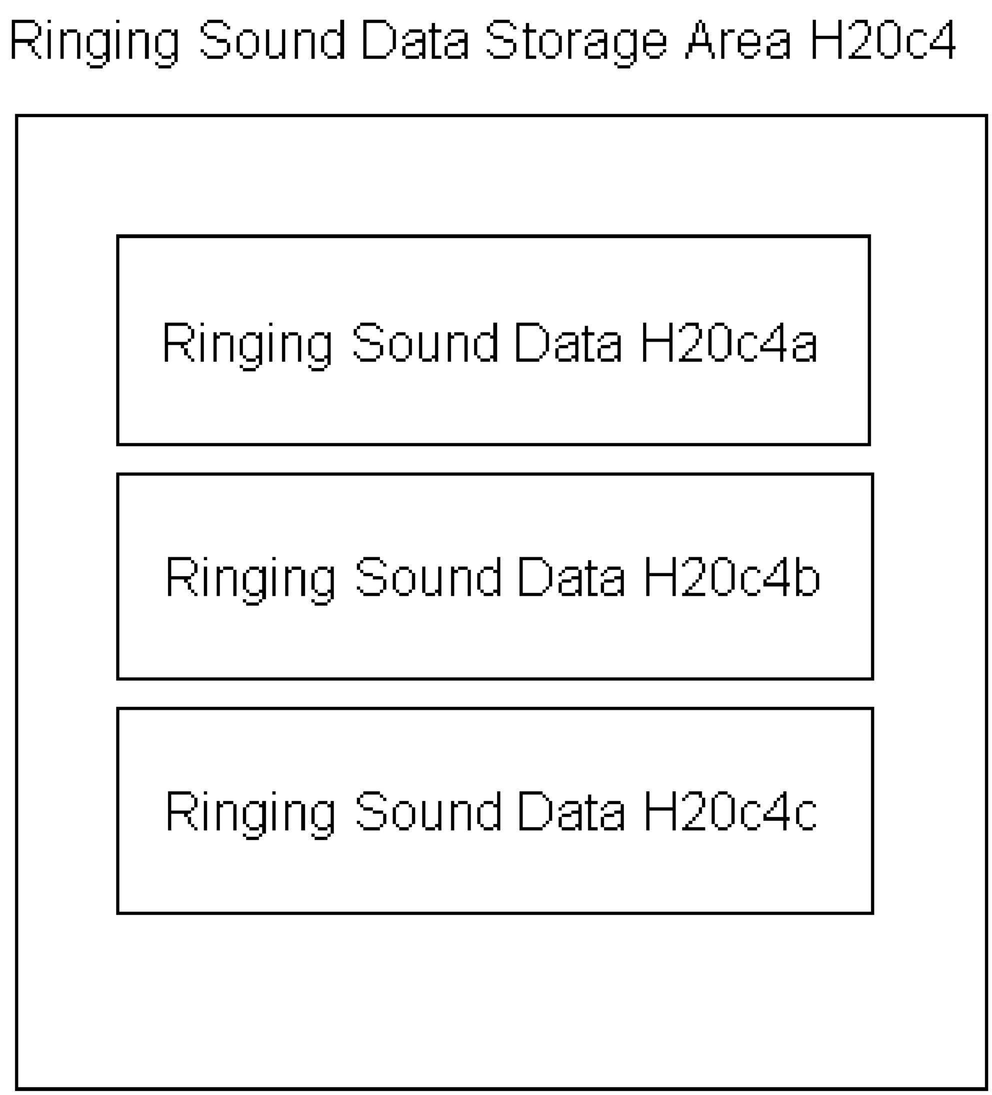

FIG. 440 is a block diagram illustrating an exemplary embodiment of the present invention.

Figure 441:
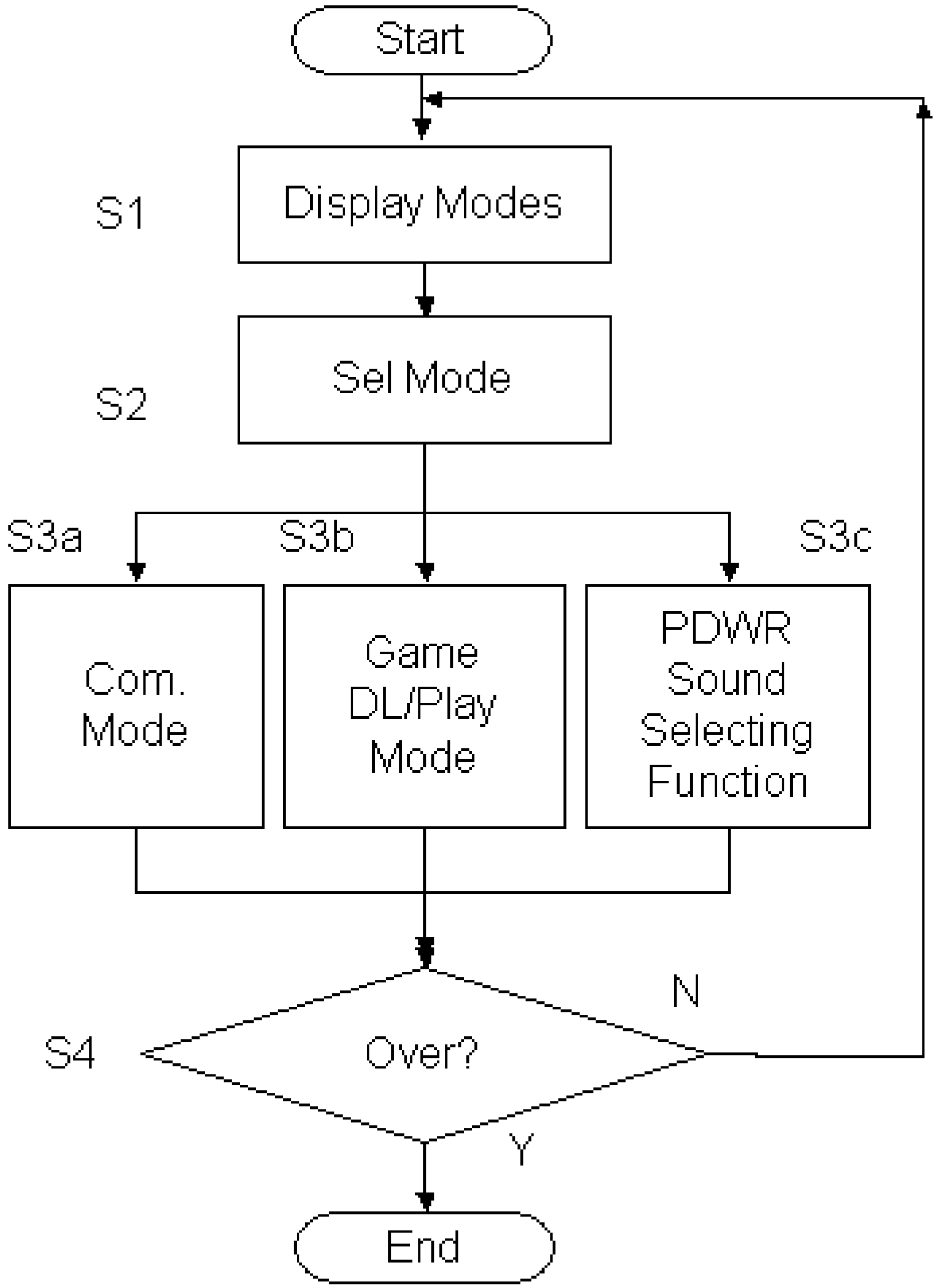

FIG. 441 is a block diagram illustrating an exemplary embodiment of the present invention.

Figure 442:
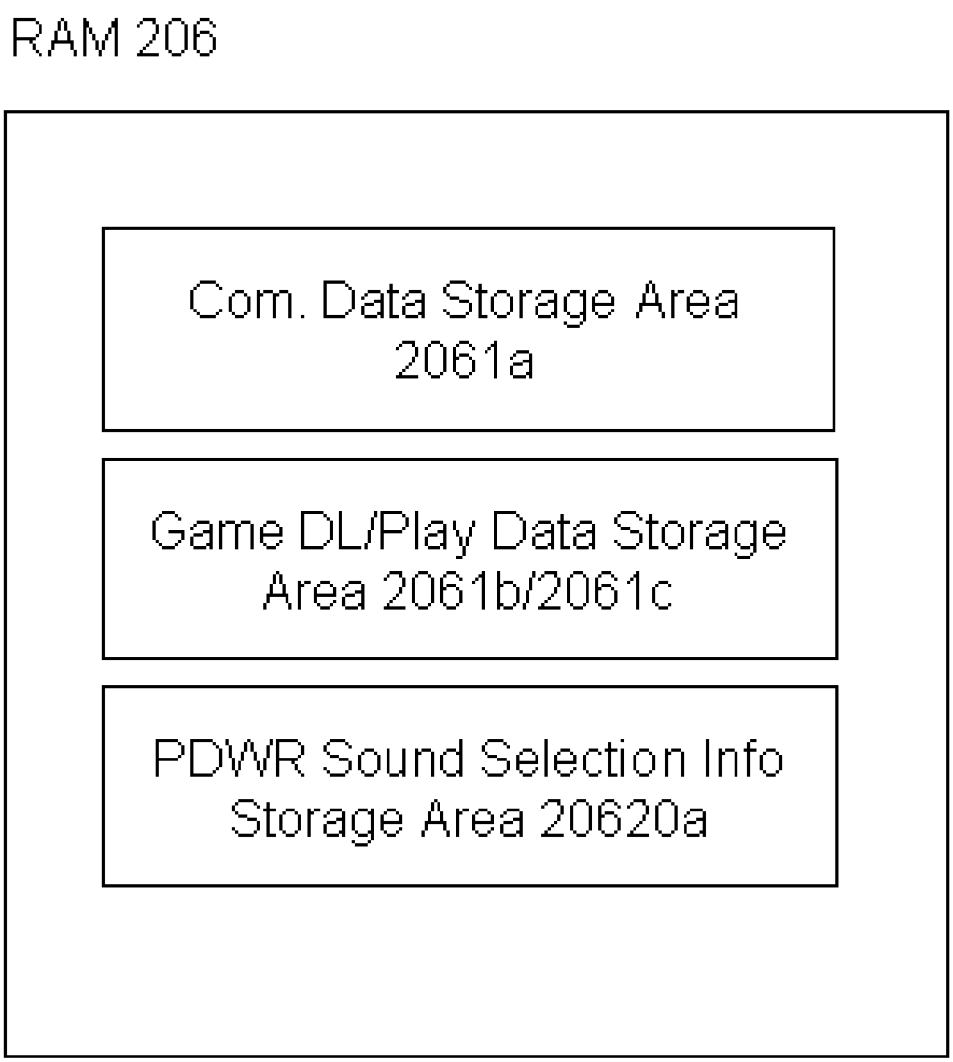

FIG. 442 is a block diagram illustrating an exemplary embodiment of the present invention.

Figure 443:
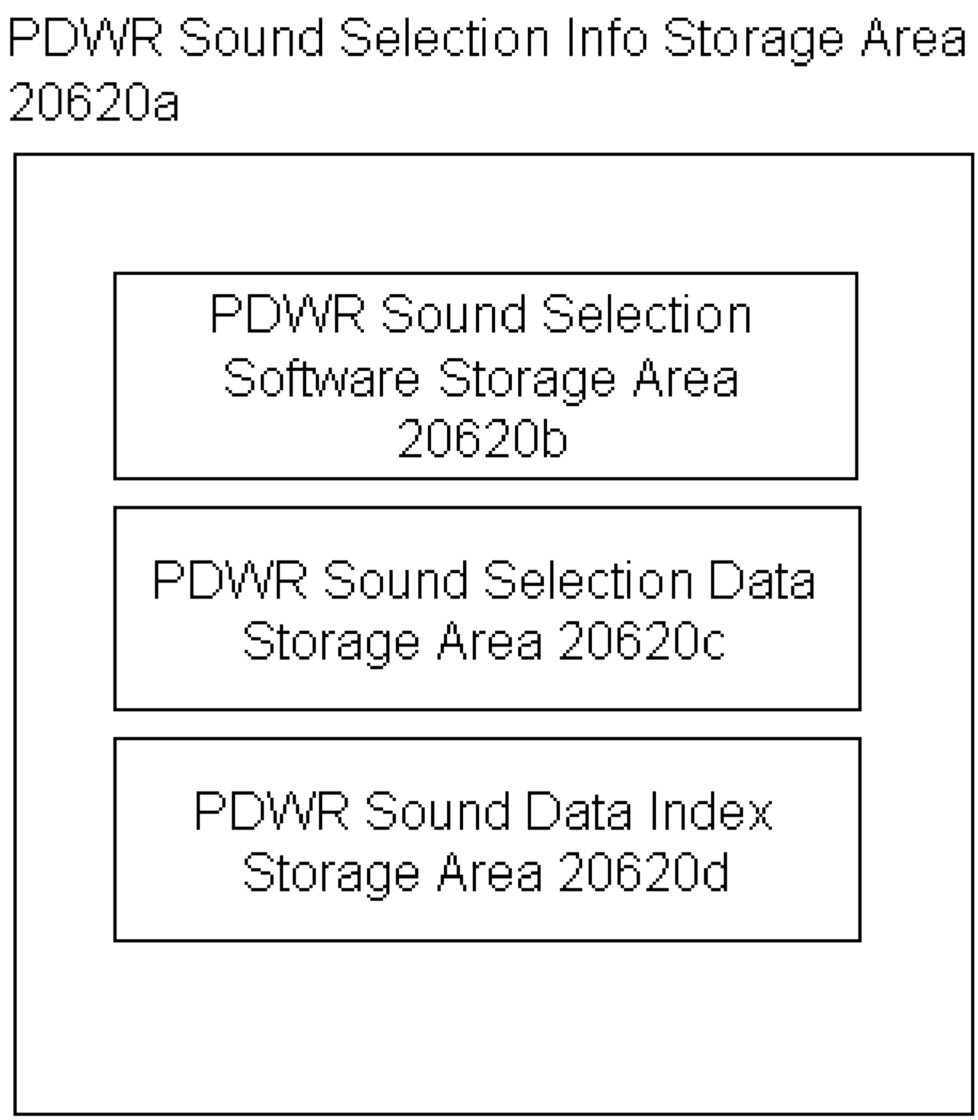

FIG. 443 is a block diagram illustrating an exemplary embodiment of the present invention.

Figure 444:
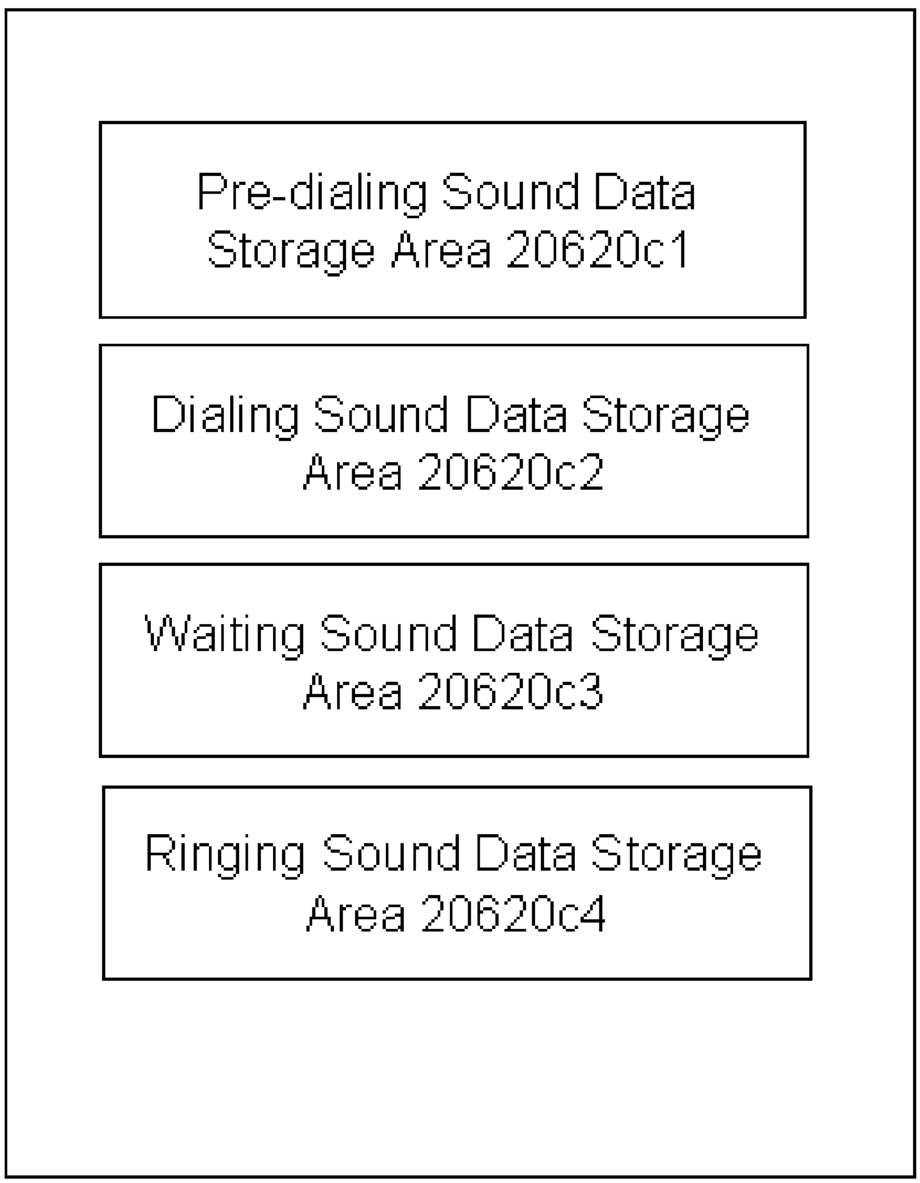

FIG. 444 is a block diagram illustrating an exemplary embodiment of the present invention.

Figure 445:
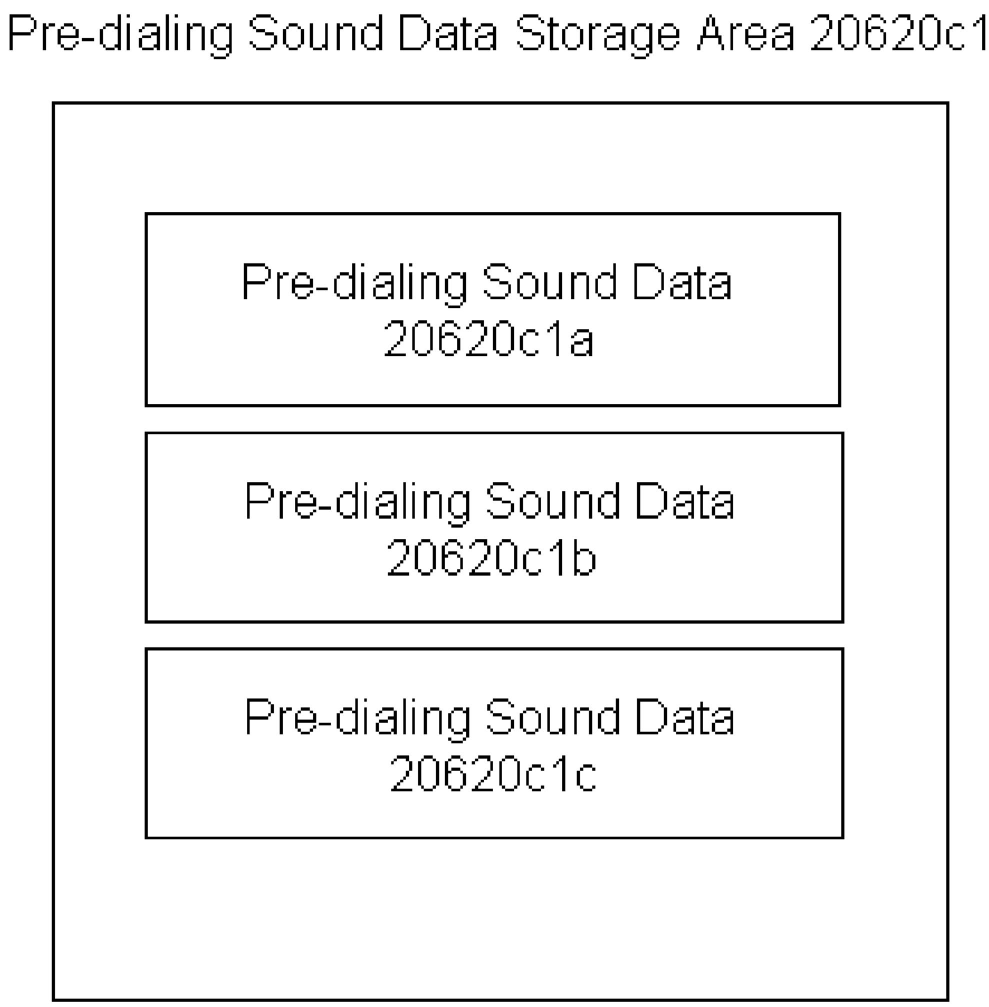

FIG. 445 is a block diagram illustrating an exemplary embodiment of the present invention.

Figure 446:
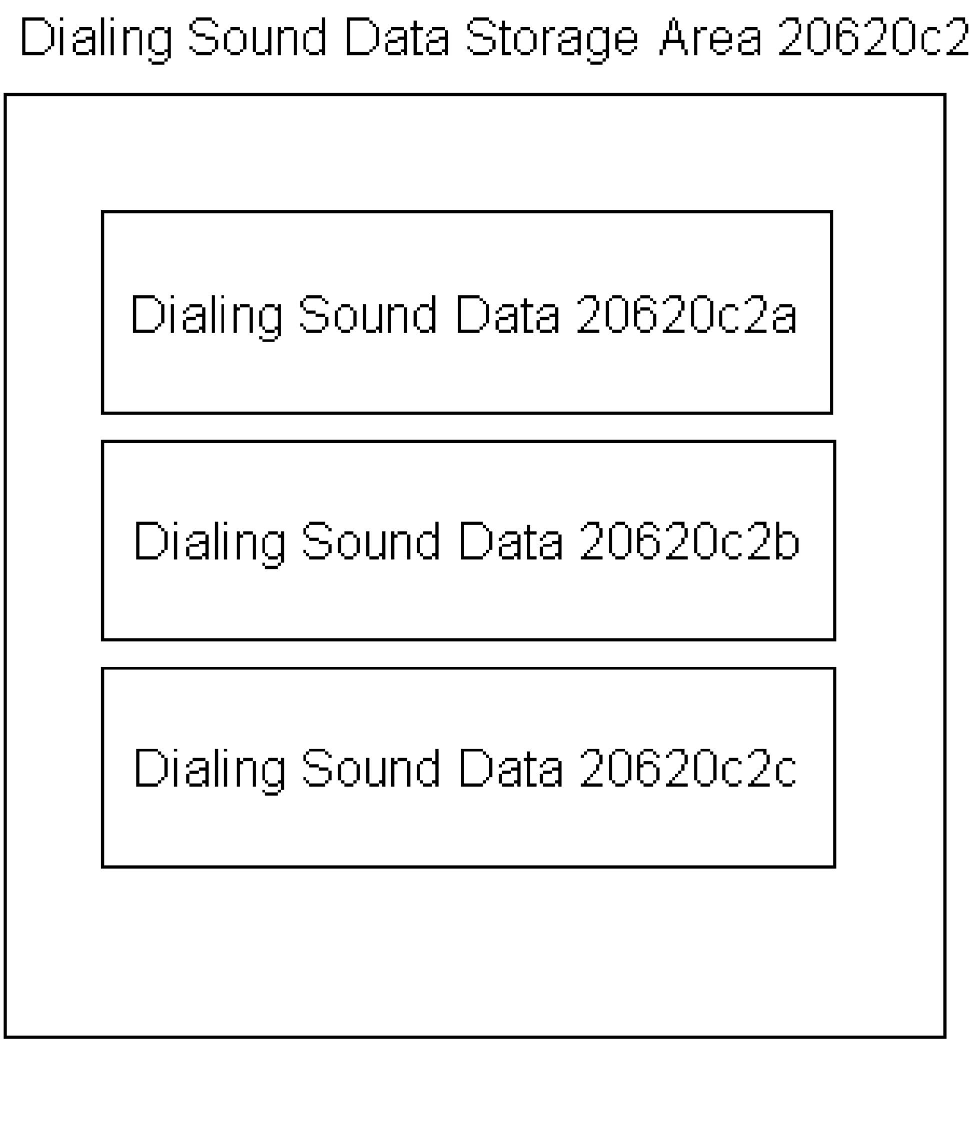

FIG. 446 is a block diagram illustrating an exemplary embodiment of the present invention.

Figure 447:
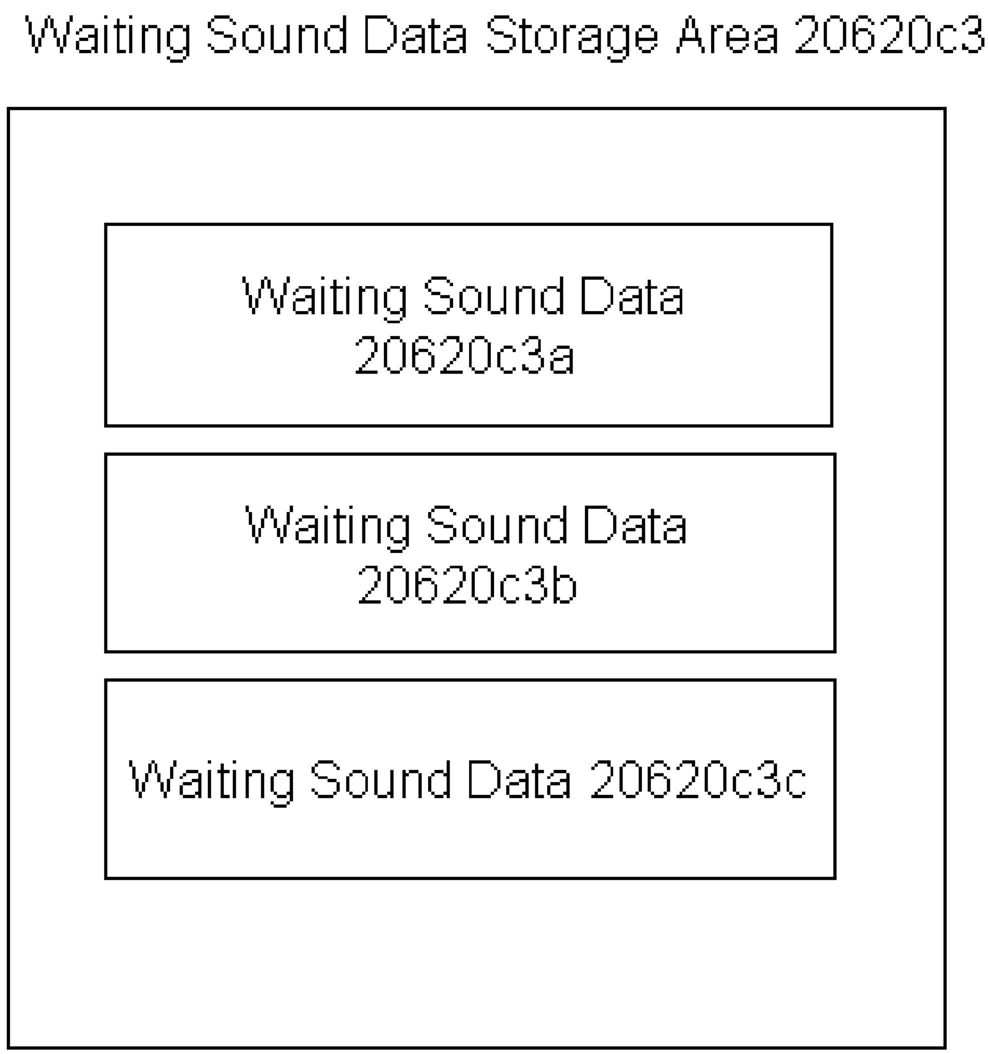

FIG. 447 is a block diagram illustrating an exemplary embodiment of the present invention.

Figure 448:
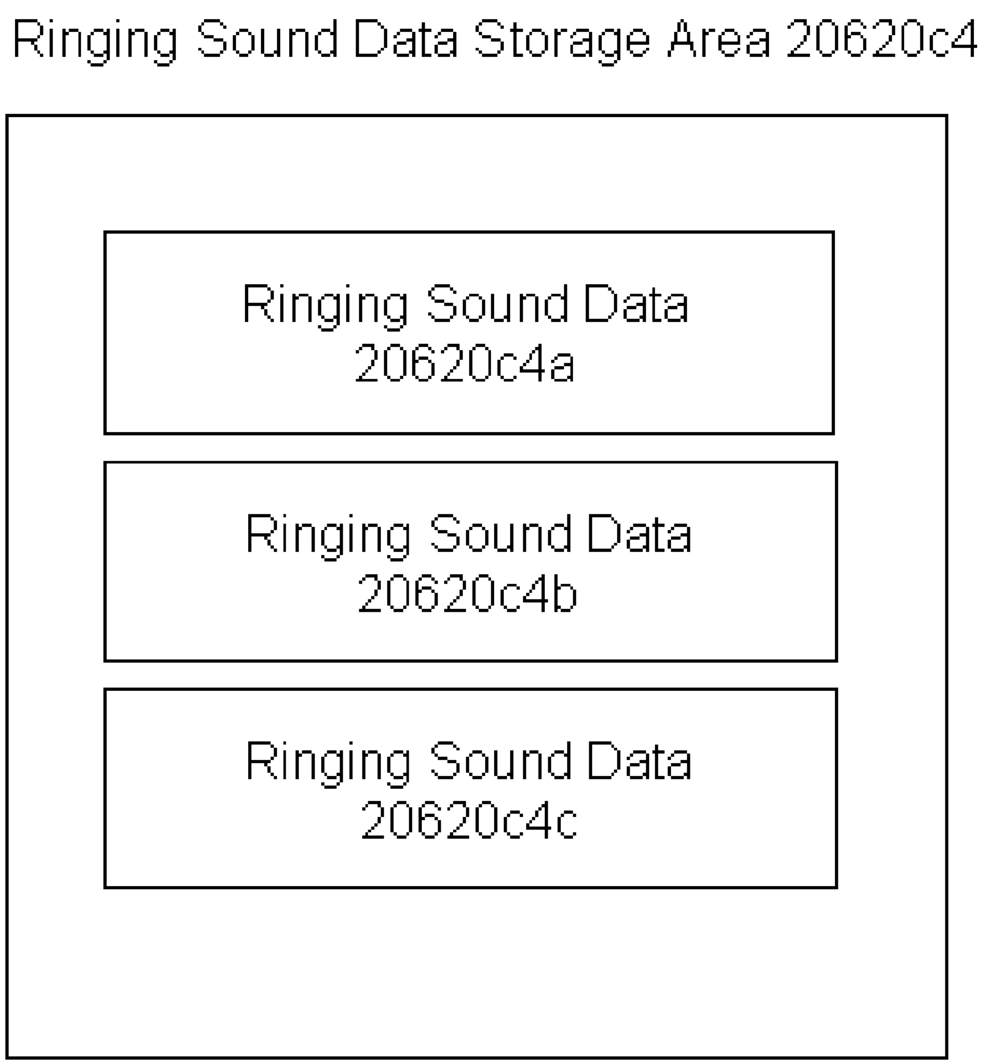

FIG. 448 is a block diagram illustrating an exemplary embodiment of the present invention.

Figure 449:
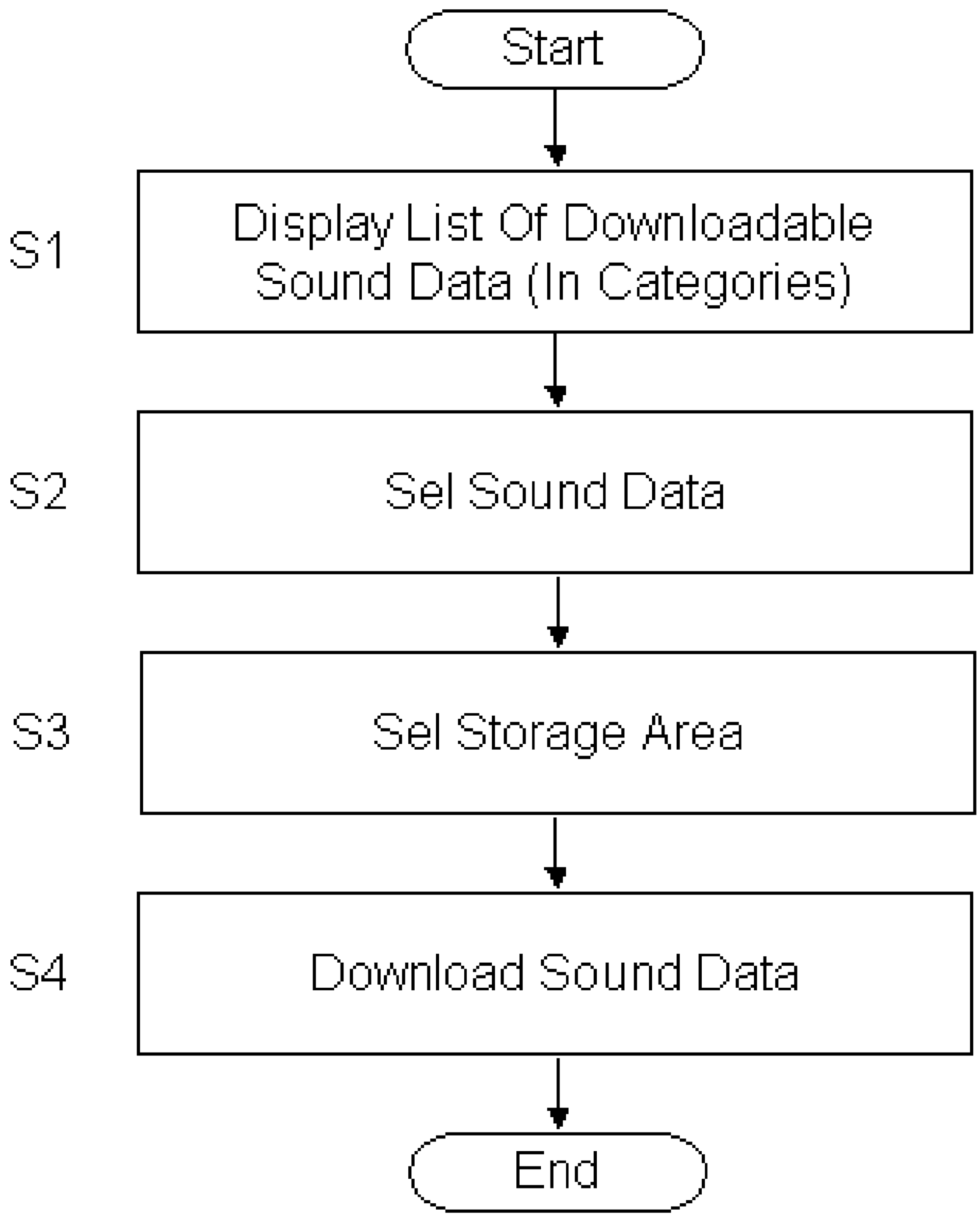

FIG. 449 is a flowchart illustrating an exemplary embodiment of the present invention.

FIG. 450 is a simplified illustration illustrating an exemplary embodiment of the present invention.

FIG. 451 is a simplified illustration illustrating an exemplary embodiment of the present invention.

Figure 452:
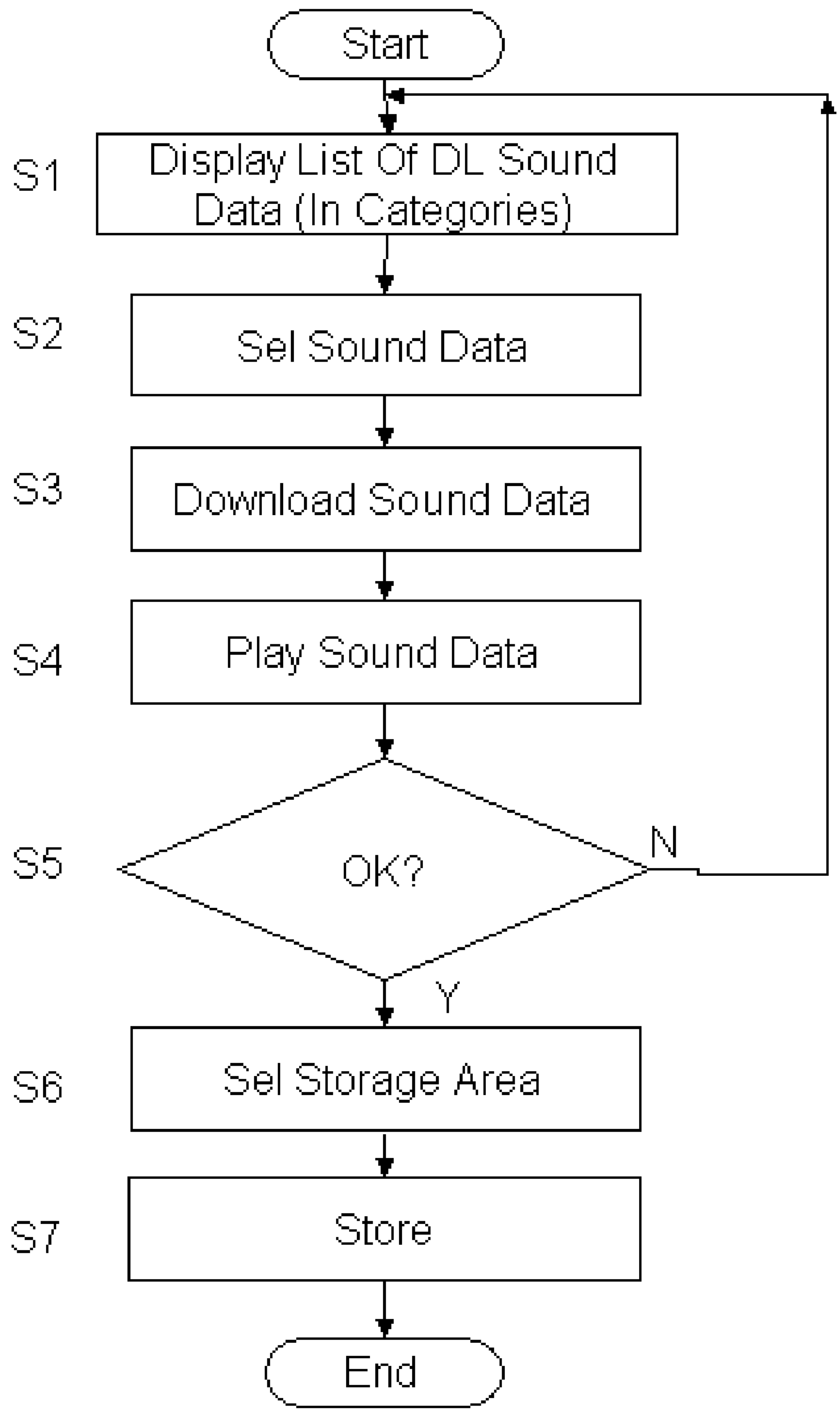

FIG. 452 is a flowchart illustrating an exemplary embodiment of the present invention.

FIG. 453 is a simplified illustration illustrating an exemplary embodiment of the present invention.

Figure 454:
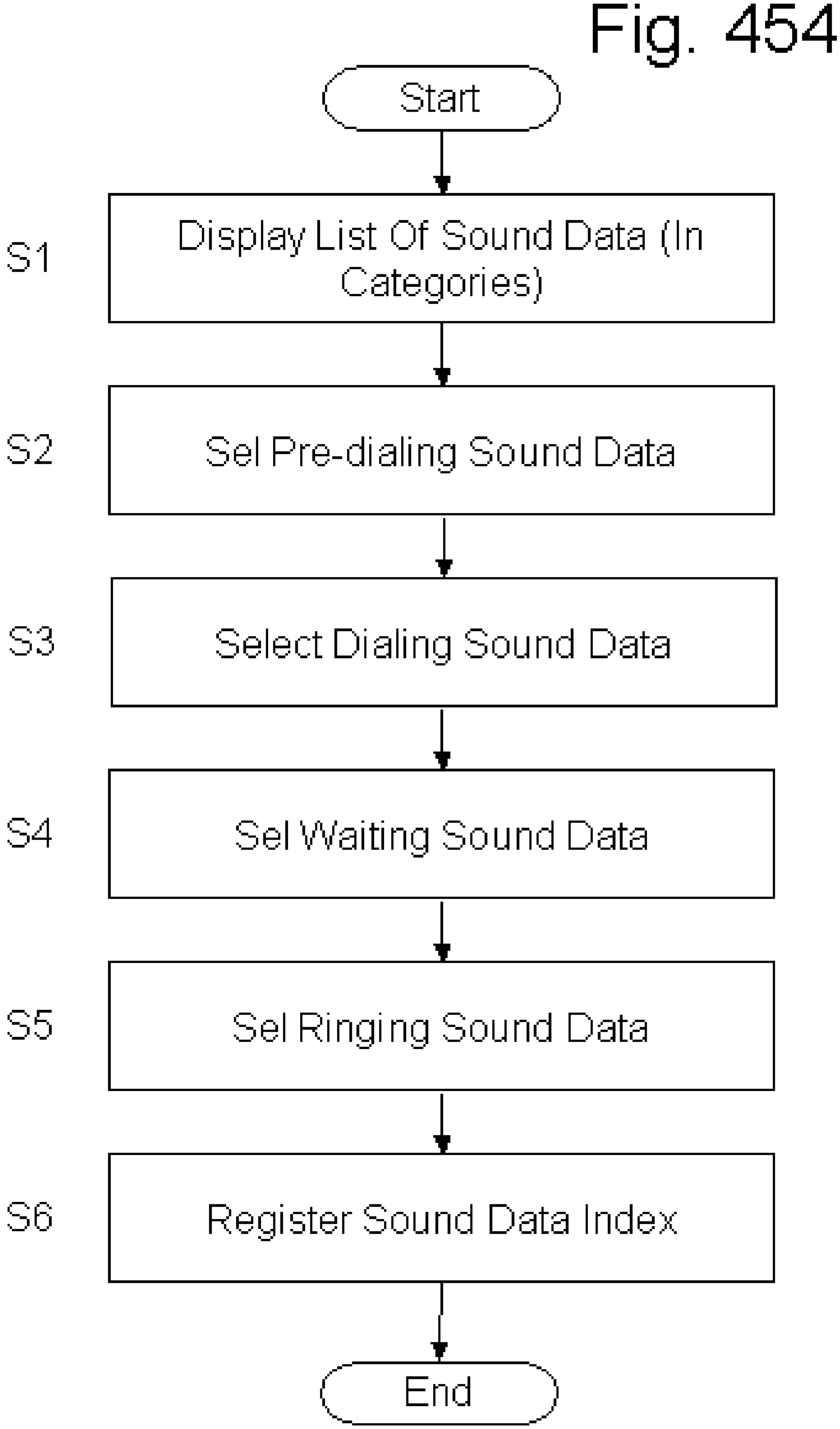

FIG. 454 is a flowchart illustrating an exemplary embodiment of the present invention.

Figure 455:
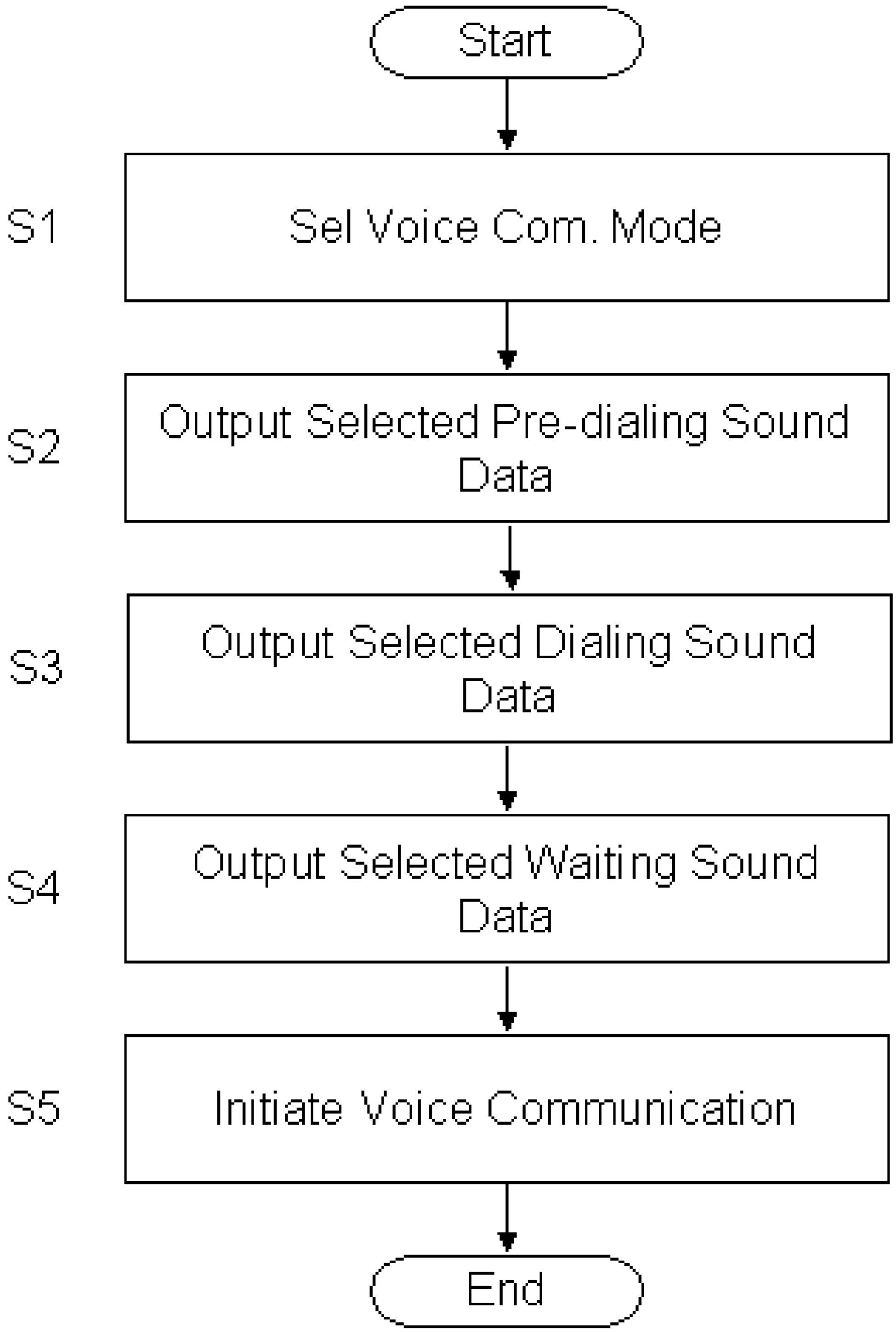

FIG. 455 is a flowchart illustrating an exemplary embodiment of the present invention.

Figure 456:
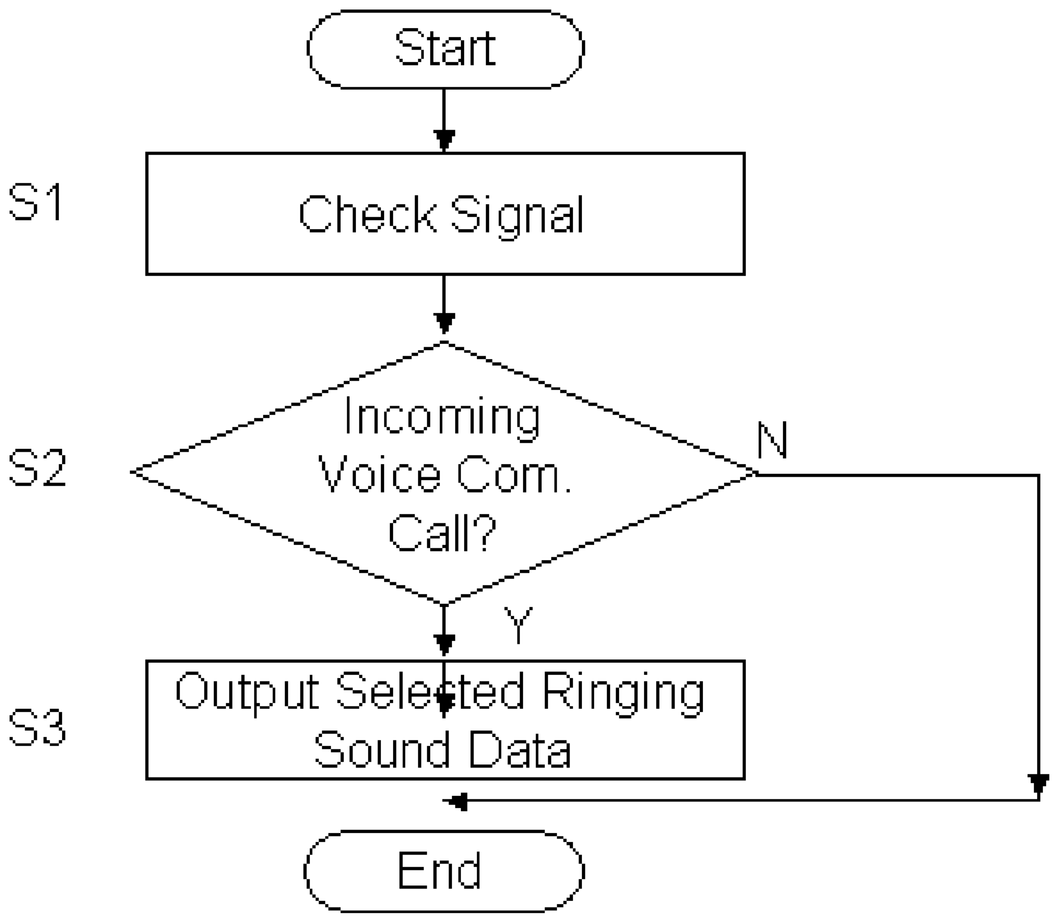

FIG. 456 is a flowchart illustrating an exemplary embodiment of the present invention.

Figure 457:
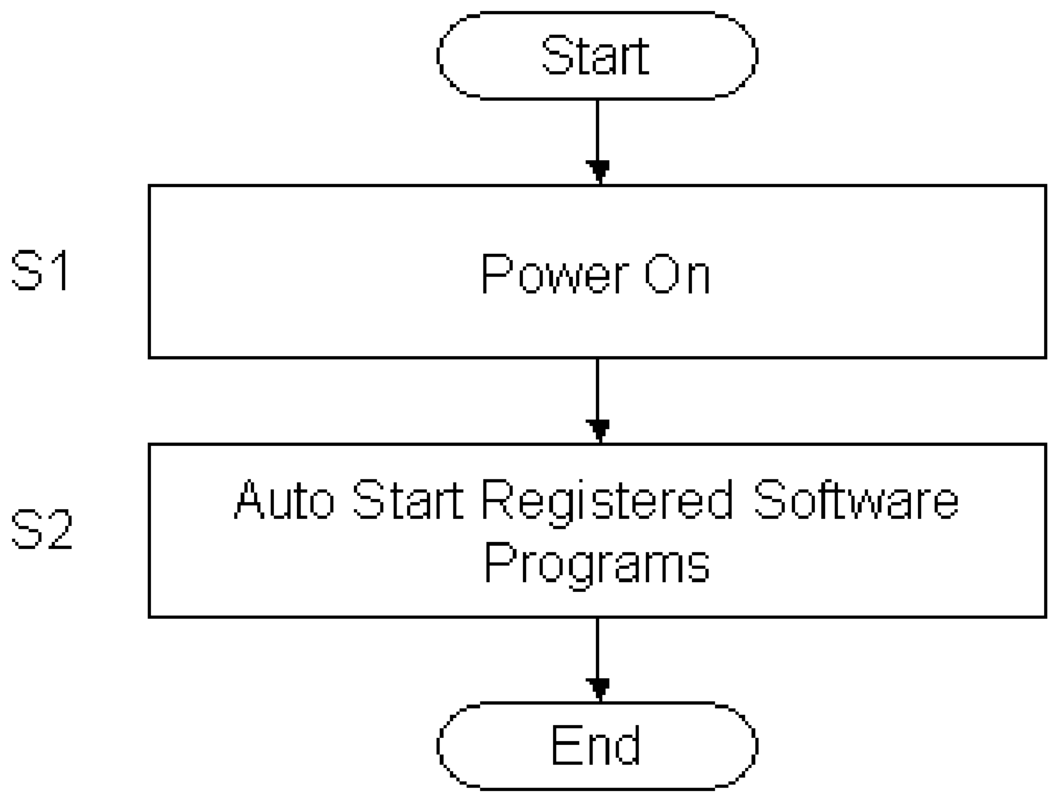

FIG. 457 is a simplified illustration illustrating an exemplary embodiment of the present invention.

Figure 458:
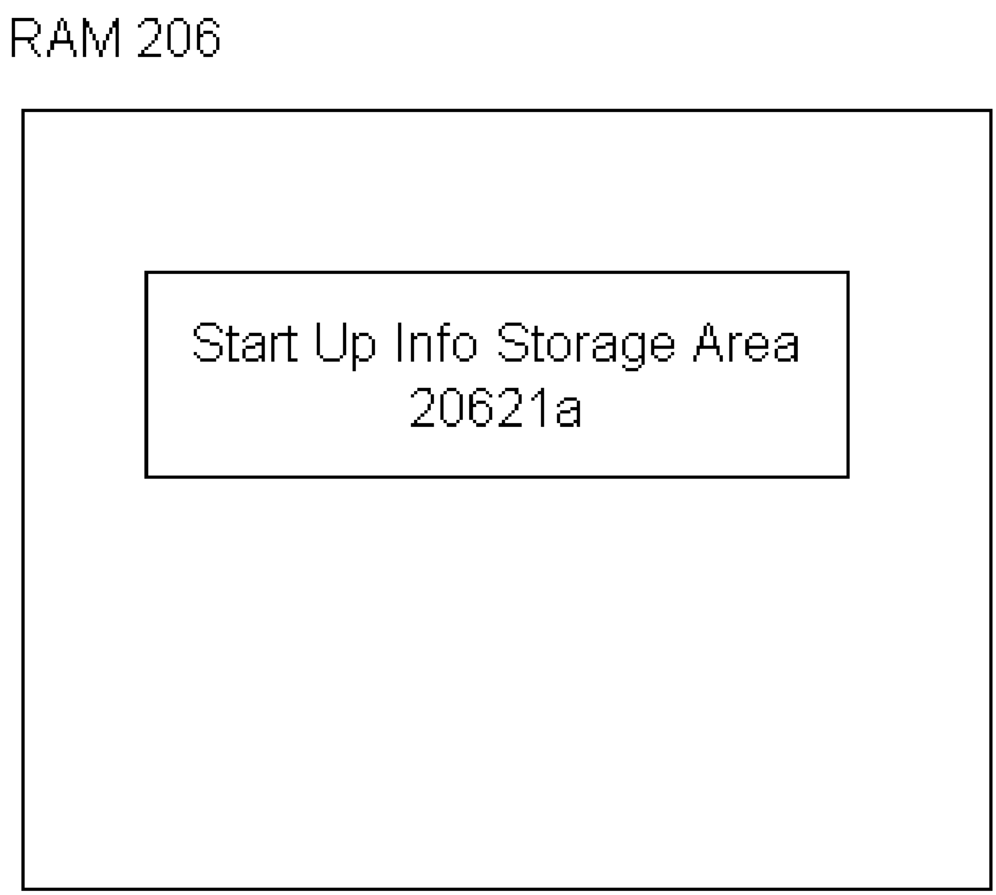

FIG. 458 is a block diagram illustrating an exemplary embodiment of the present invention.

Figure 459:
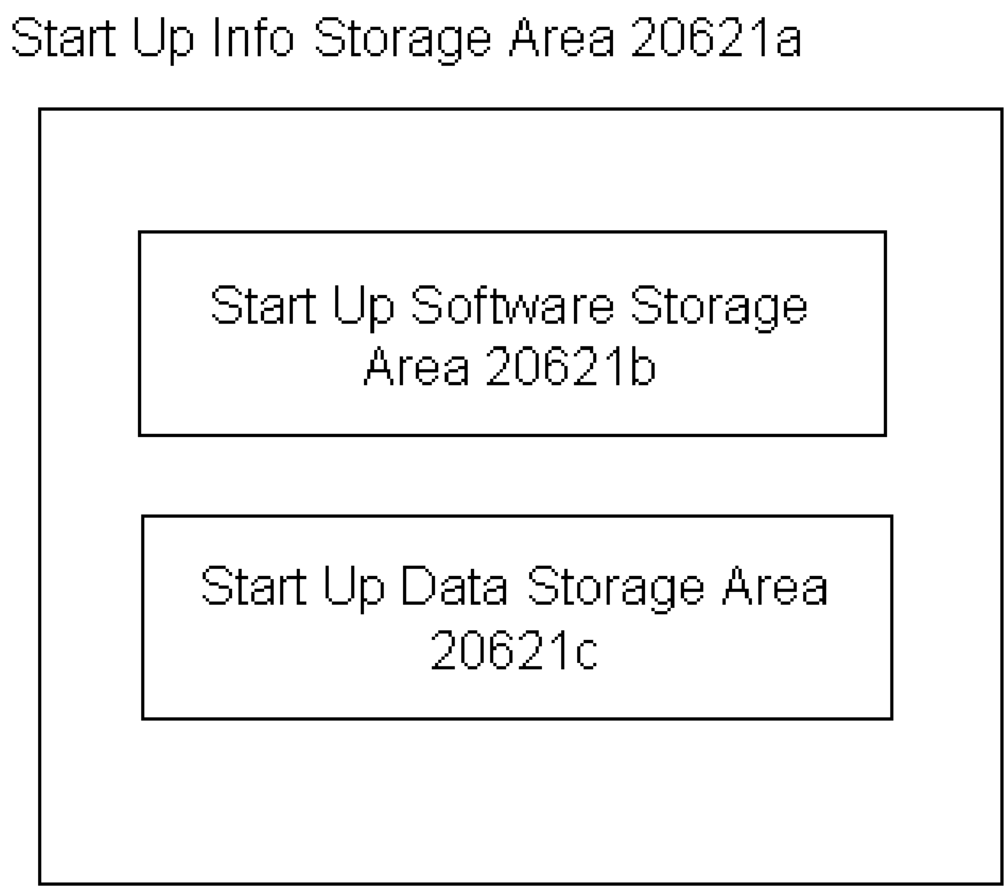

FIG. 459 is a block diagram illustrating an exemplary embodiment of the present invention.

Figure 460:
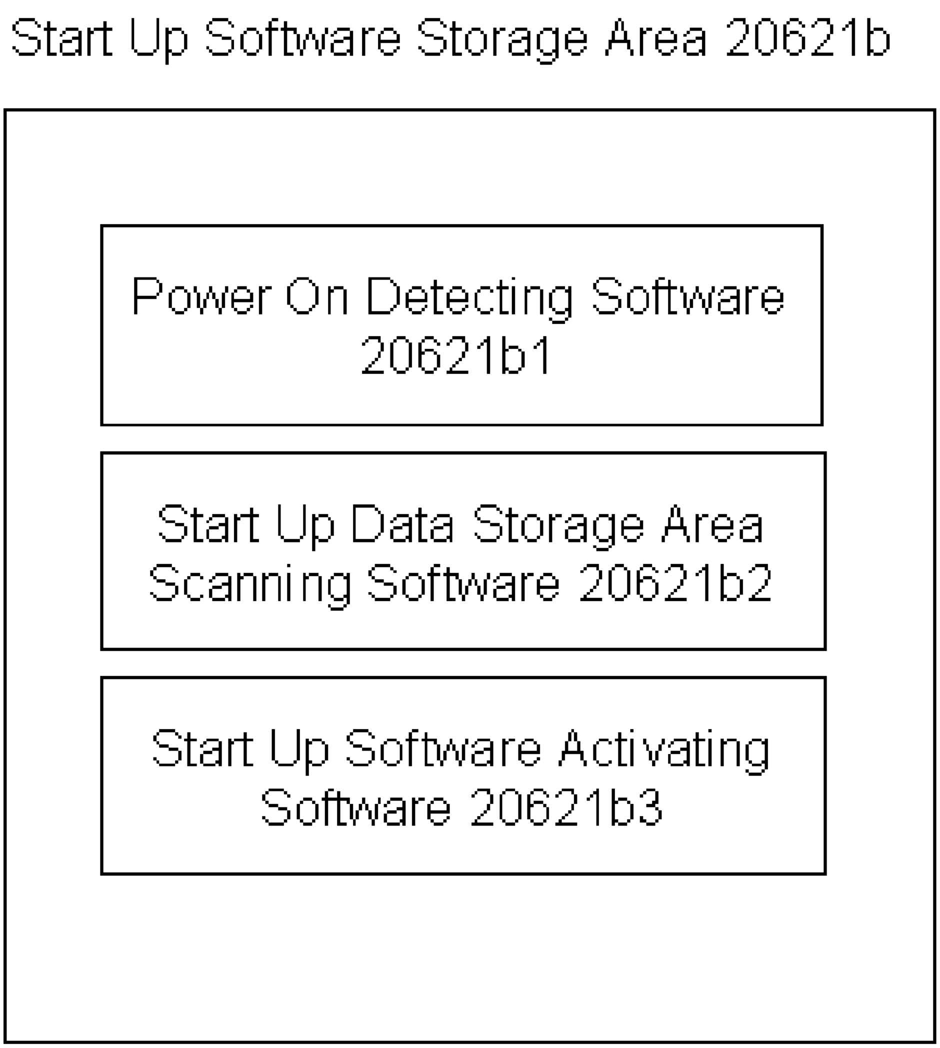

FIG. 460 is a block diagram illustrating an exemplary embodiment of the present invention.

Figure 461:
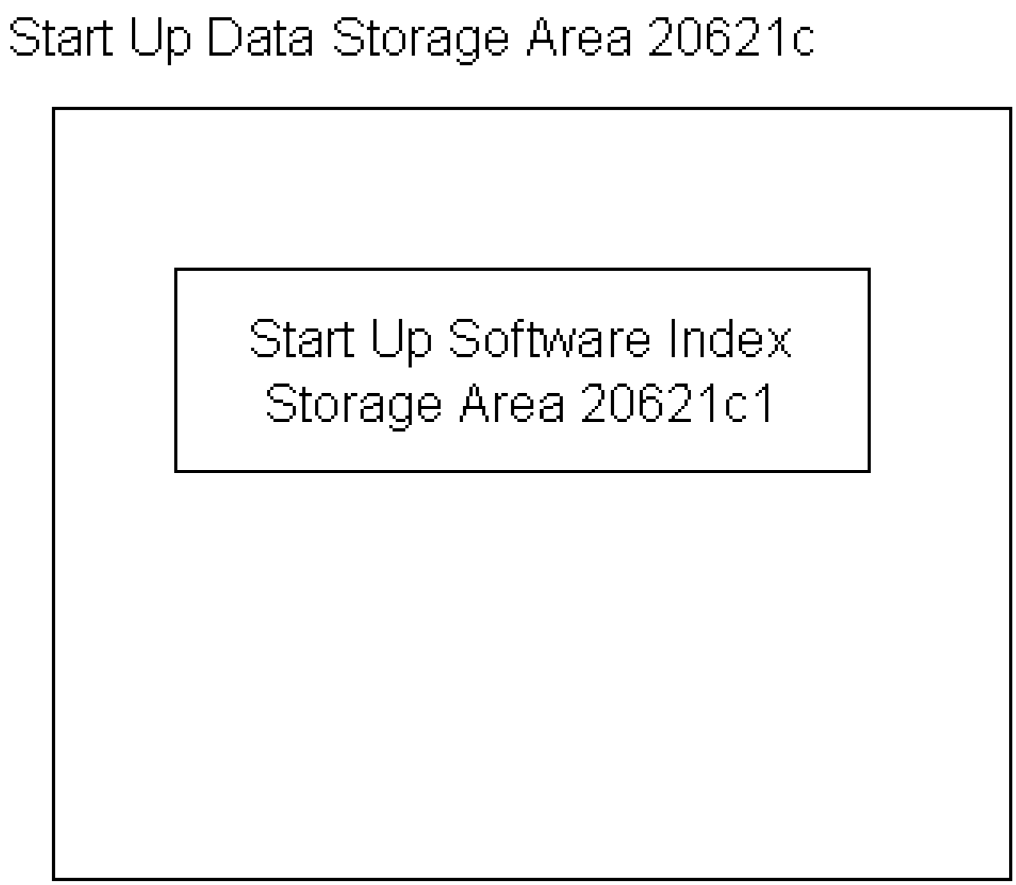

FIG. 461 is a block diagram illustrating an exemplary embodiment of the present invention.

Figure 462:
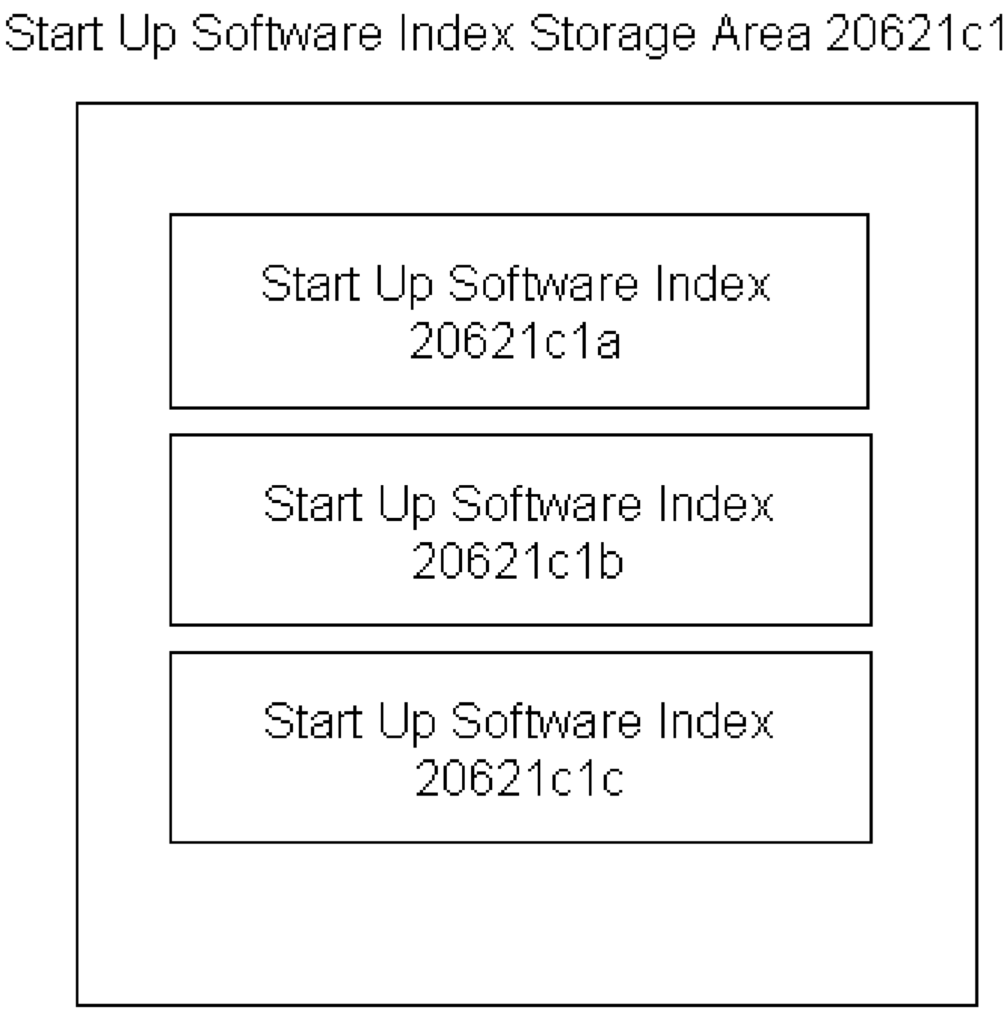

FIG. 462 is a block diagram illustrating an exemplary embodiment of the present invention.

Figure 463:
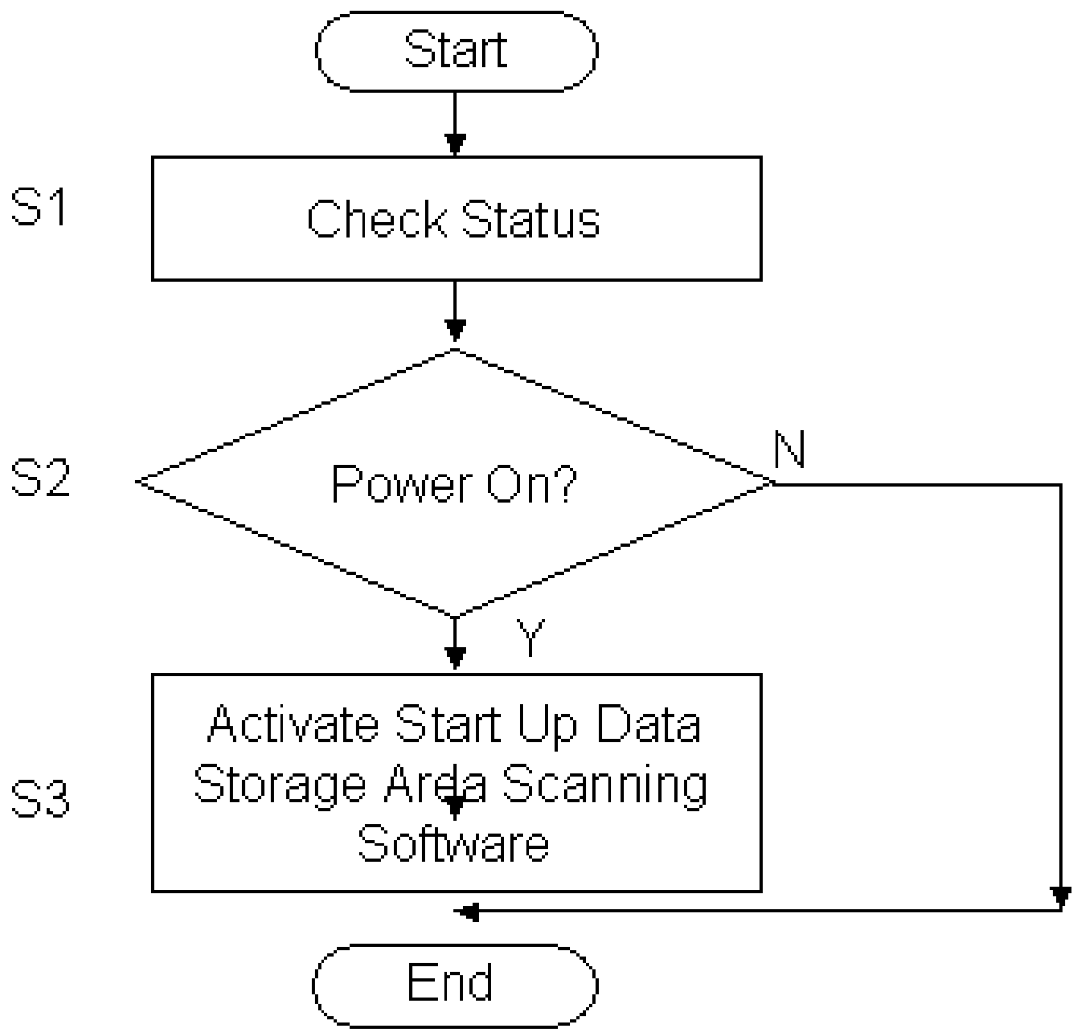

FIG. 463 is a flowchart illustrating an exemplary embodiment of the present invention.

Figure 464:
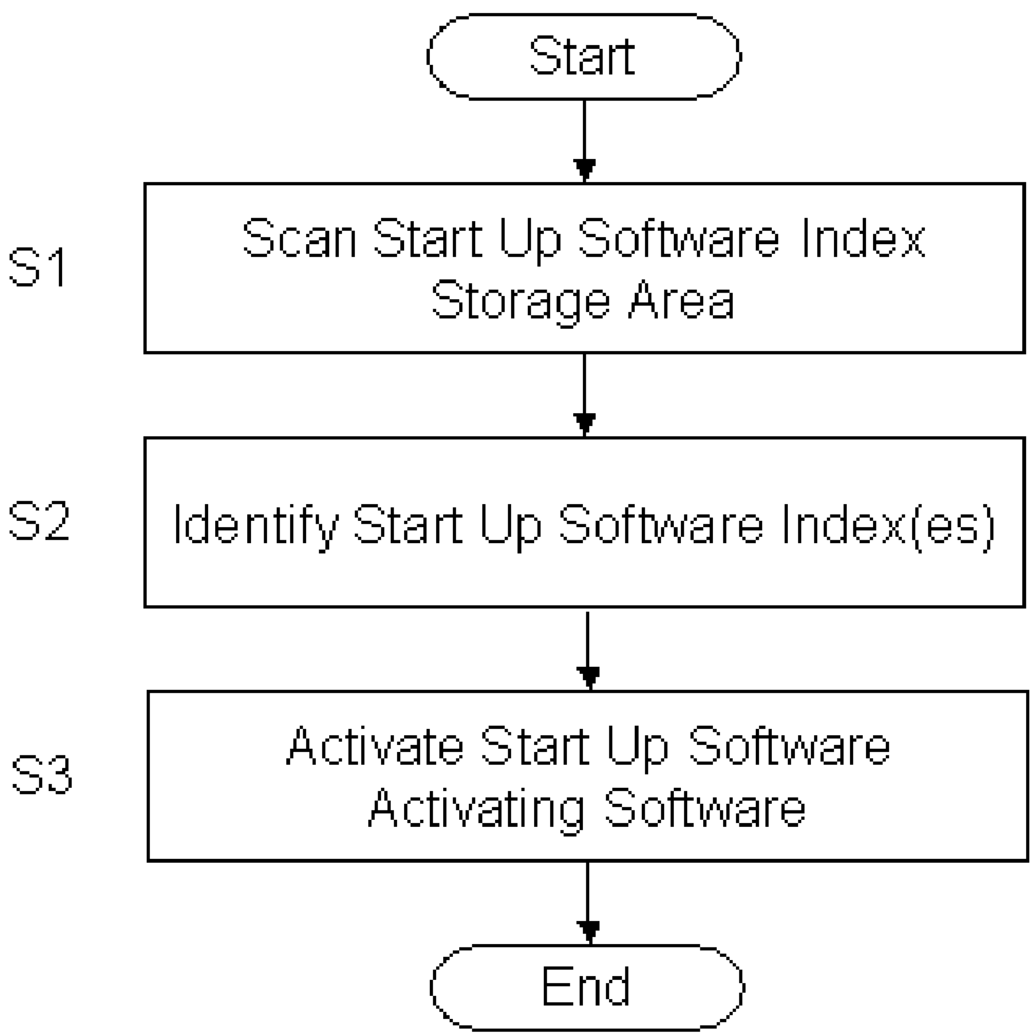

FIG. 464 is a flowchart illustrating an exemplary embodiment of the present invention.

Figure 465:
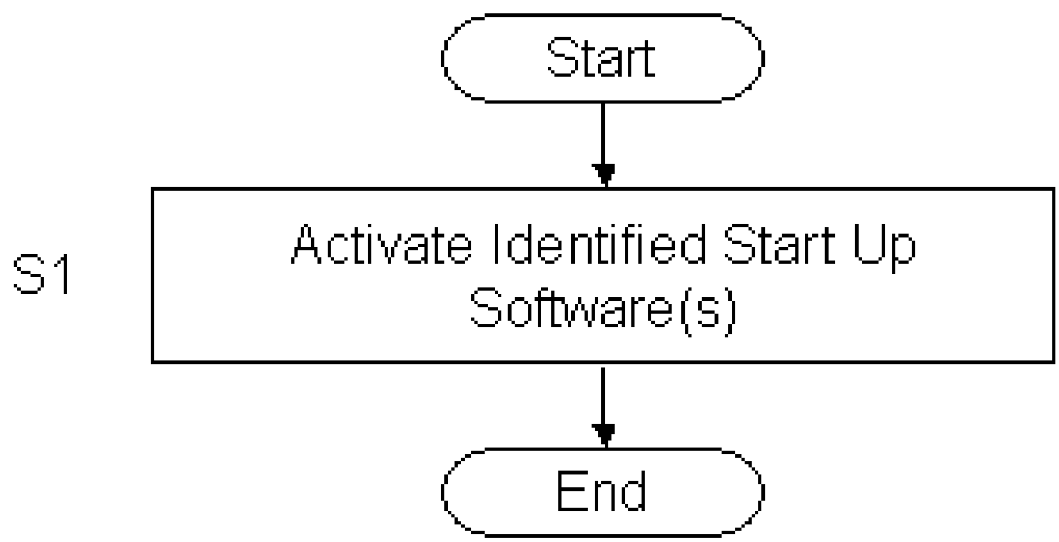

FIG. 465 is a flowchart illustrating an exemplary embodiment of the present invention.

Figure 466:
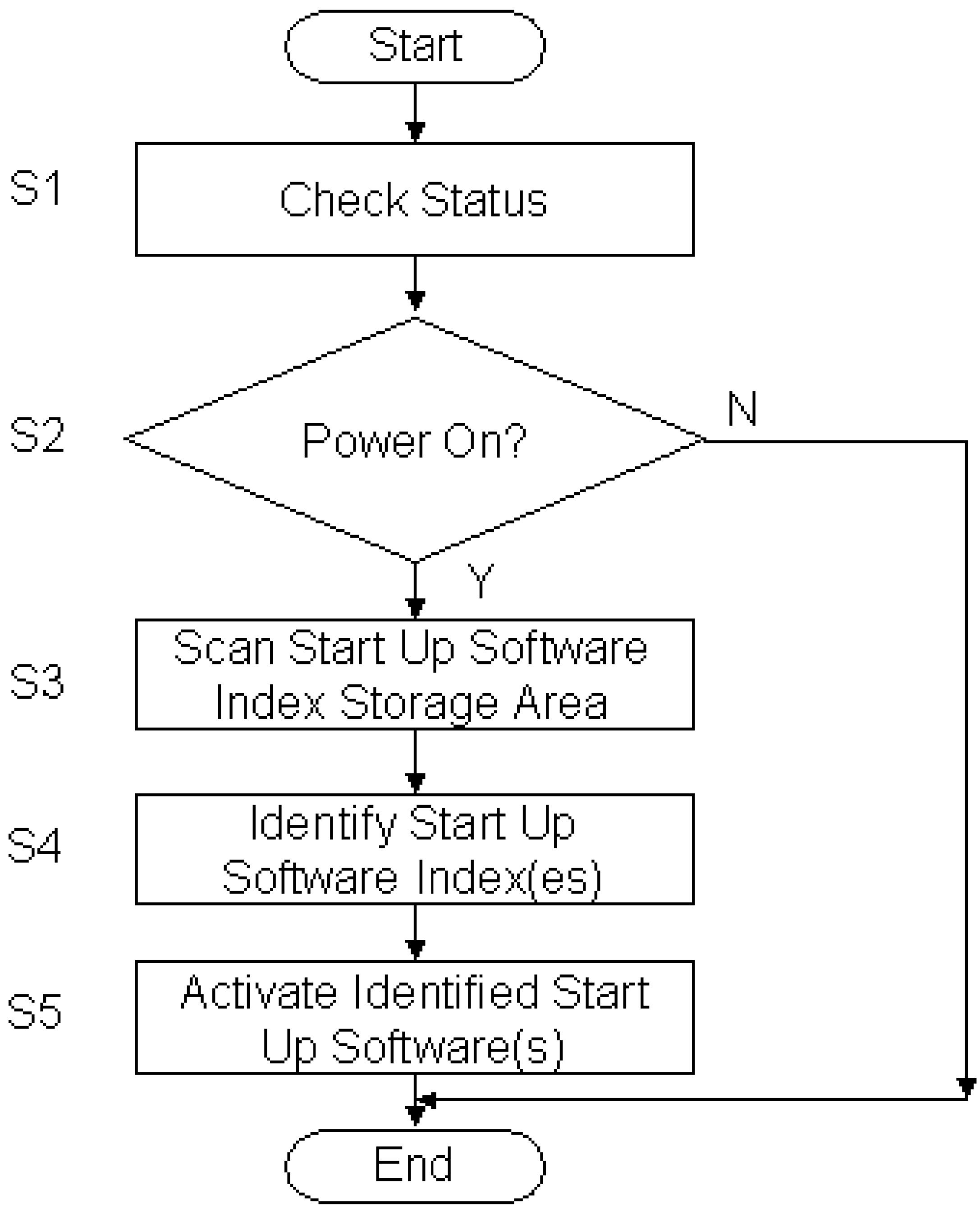

FIG. 466 is a flowchart illustrating an exemplary embodiment of the present invention.

Figure 467A:
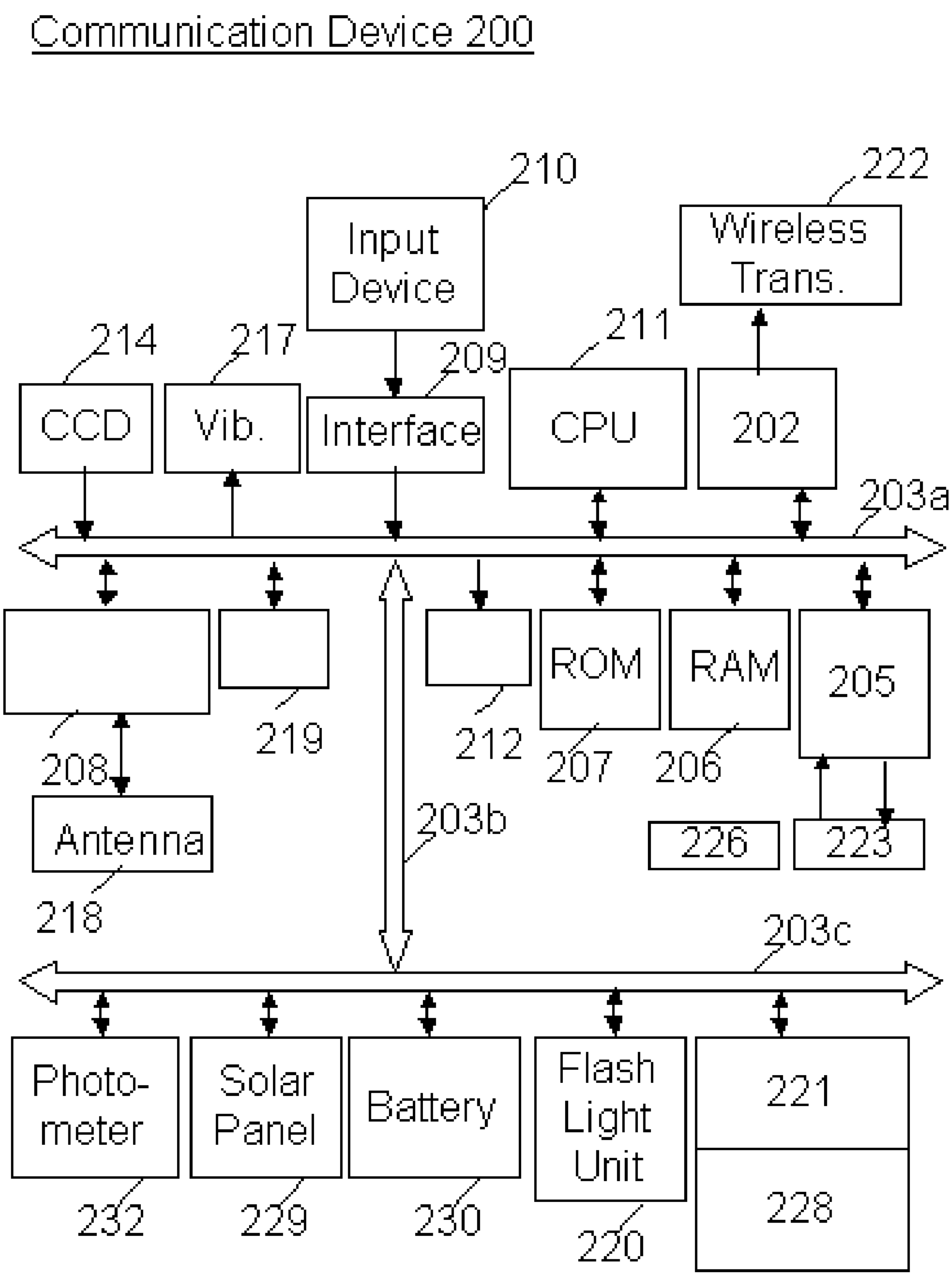

FIG. 467*a* is a block diagram illustrating an exemplary embodiment of the present invention.

Figure 467B:
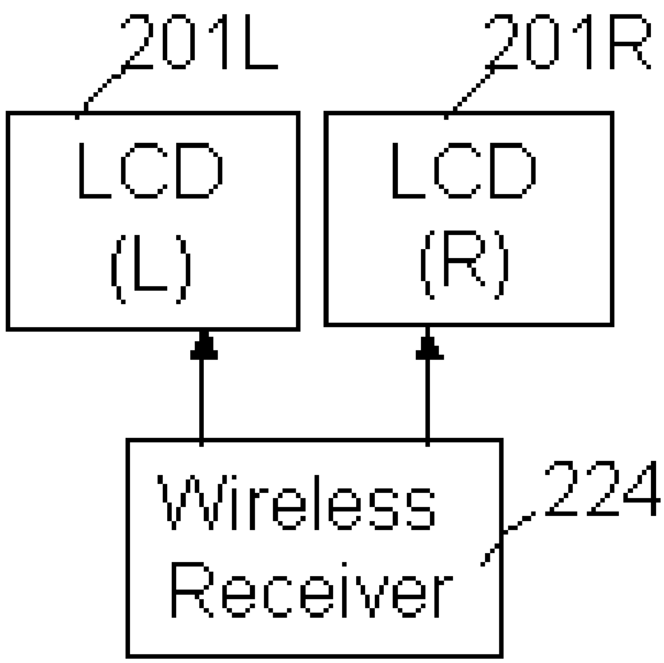

FIG. 467*b* is a block diagram illustrating an exemplary embodiment of the present invention.

Figure 467C:
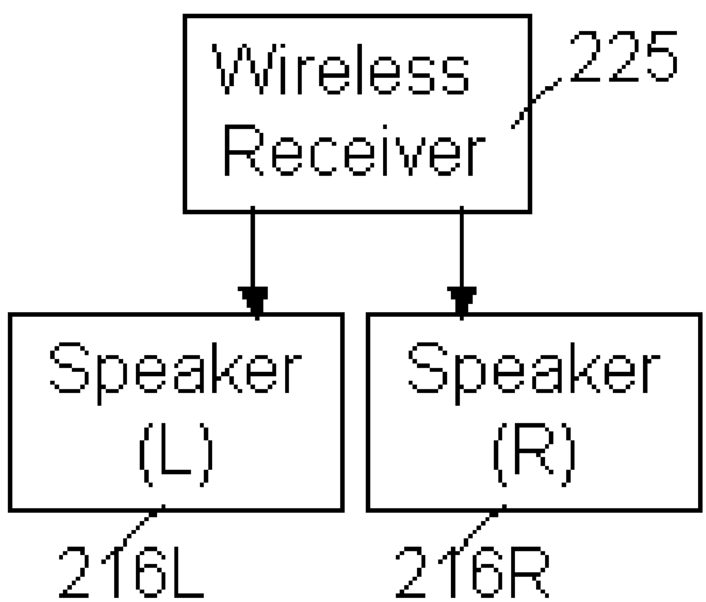

FIG. 467*c* is a block diagram illustrating an exemplary embodiment of the present invention.

Figure 467D:
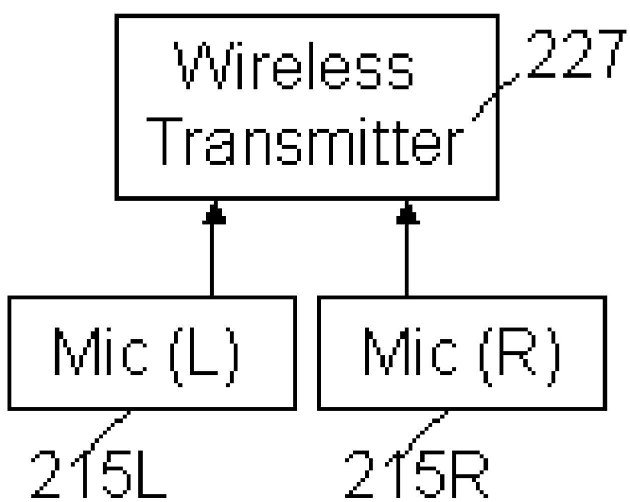

FIG. 467*d* is a block diagram illustrating an exemplary embodiment of the present invention.

Figure 468:
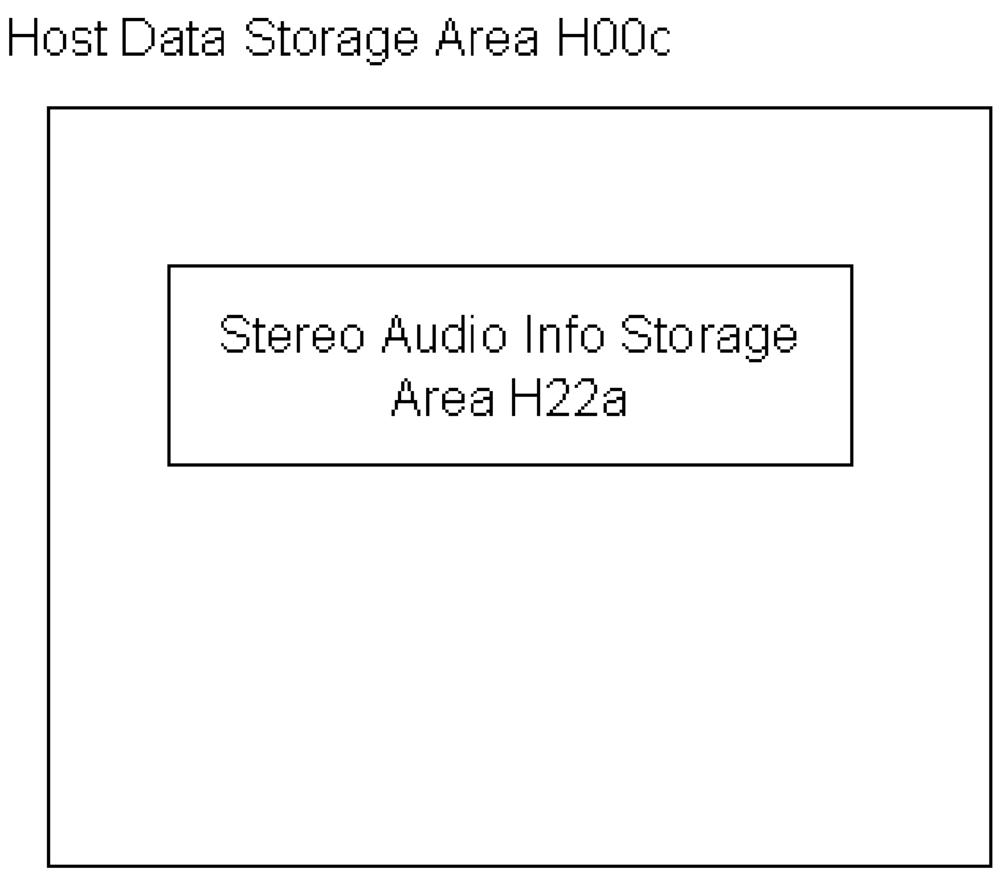

FIG. 468 is a block diagram illustrating an exemplary embodiment of the present invention.

Figure 469:
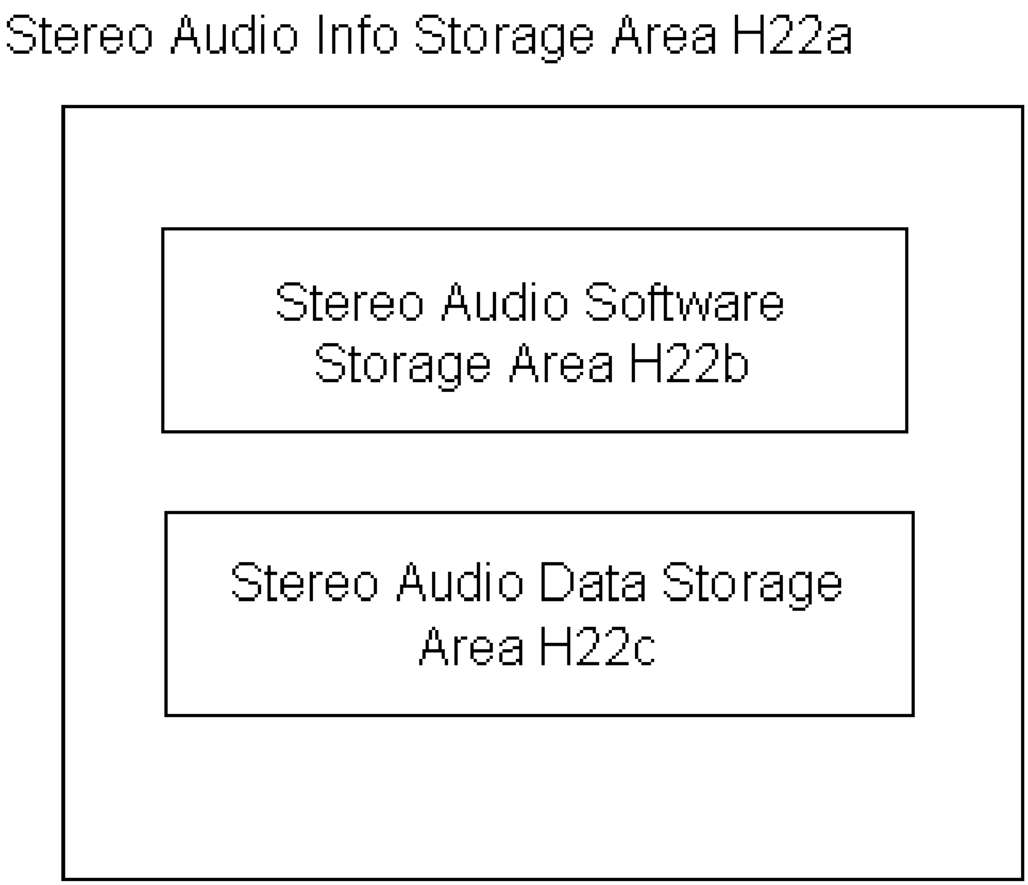

FIG. 469 is a block diagram illustrating an exemplary embodiment of the present invention.

Figure 470:
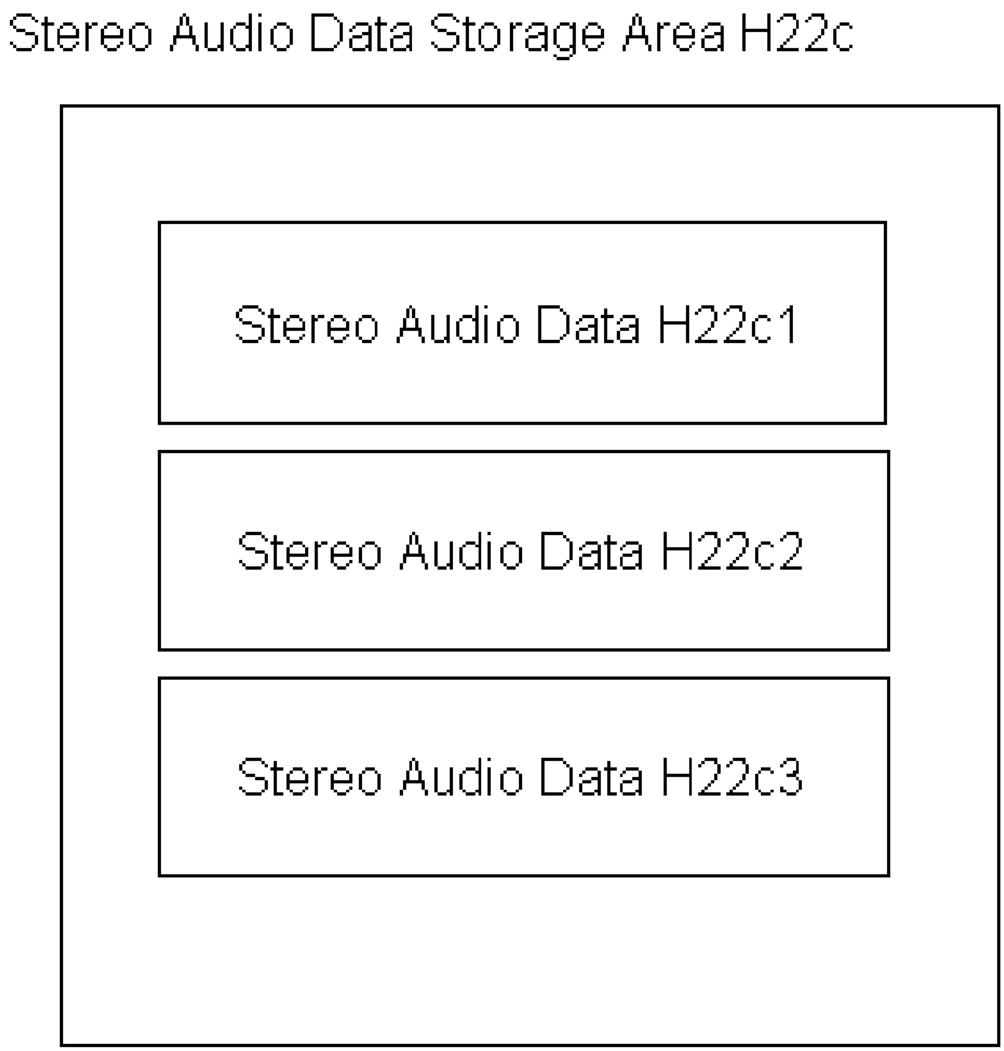

FIG. 470 is a block diagram illustrating an exemplary embodiment of the present invention.

Figure 471:
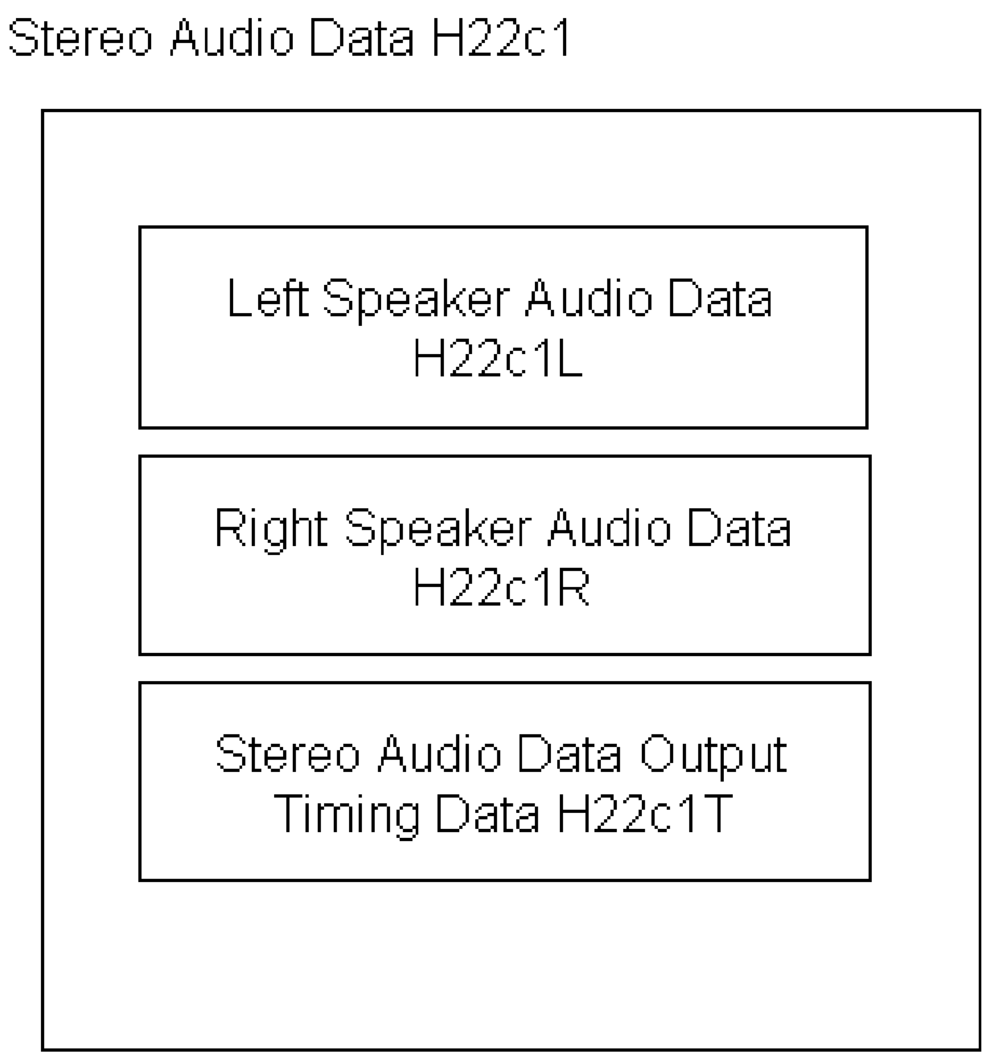

FIG. 471 is a block diagram illustrating an exemplary embodiment of the present invention.

Figure 472:
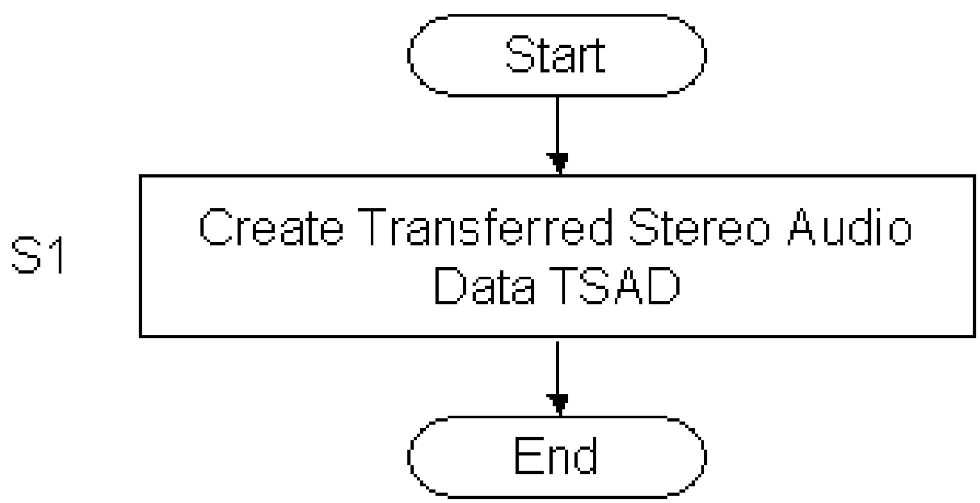

FIG. 472 is a flowchart illustrating an exemplary embodiment of the present invention.

Figure 473:
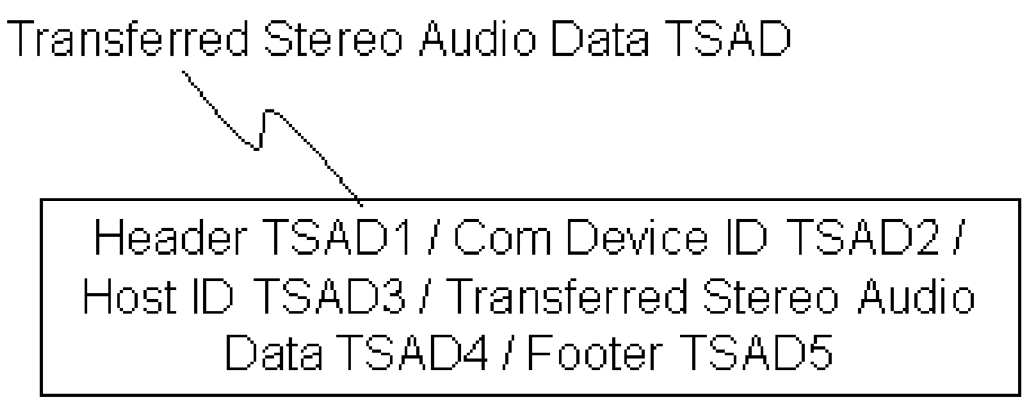

FIG. 473 is a simplified illustration of data utilized in the present invention.

Figure 474:
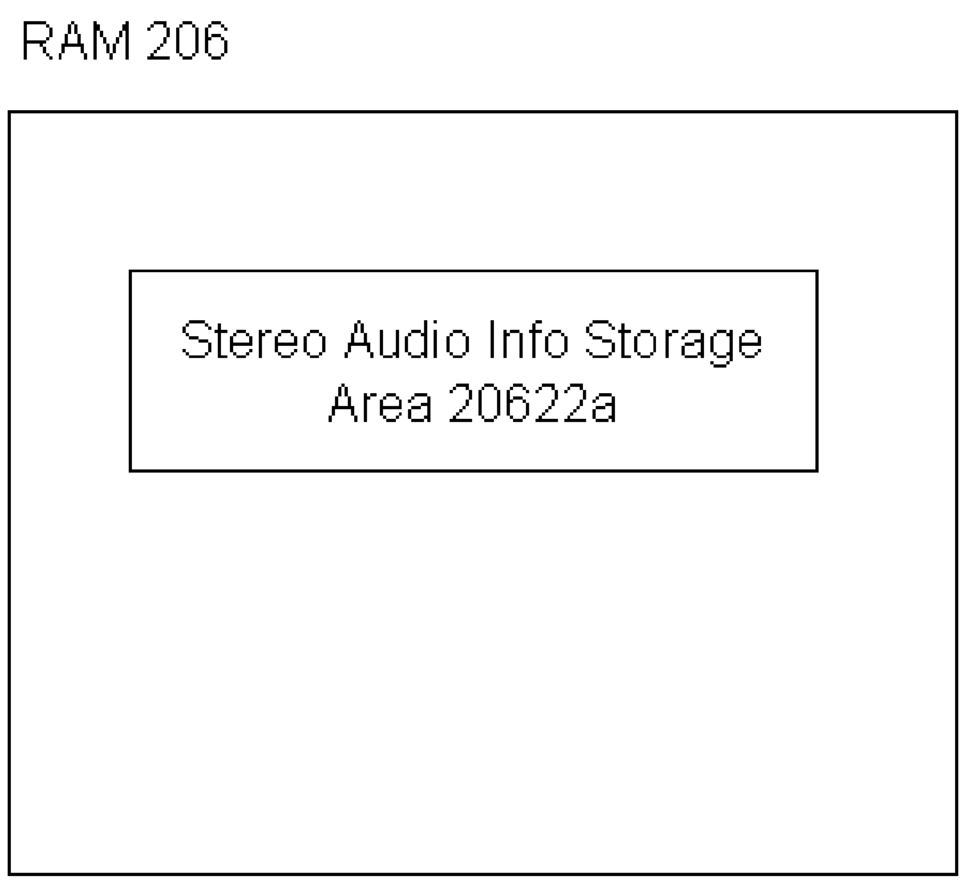

FIG. 474 is a block diagram illustrating an exemplary embodiment of the present invention.

Figure 475:
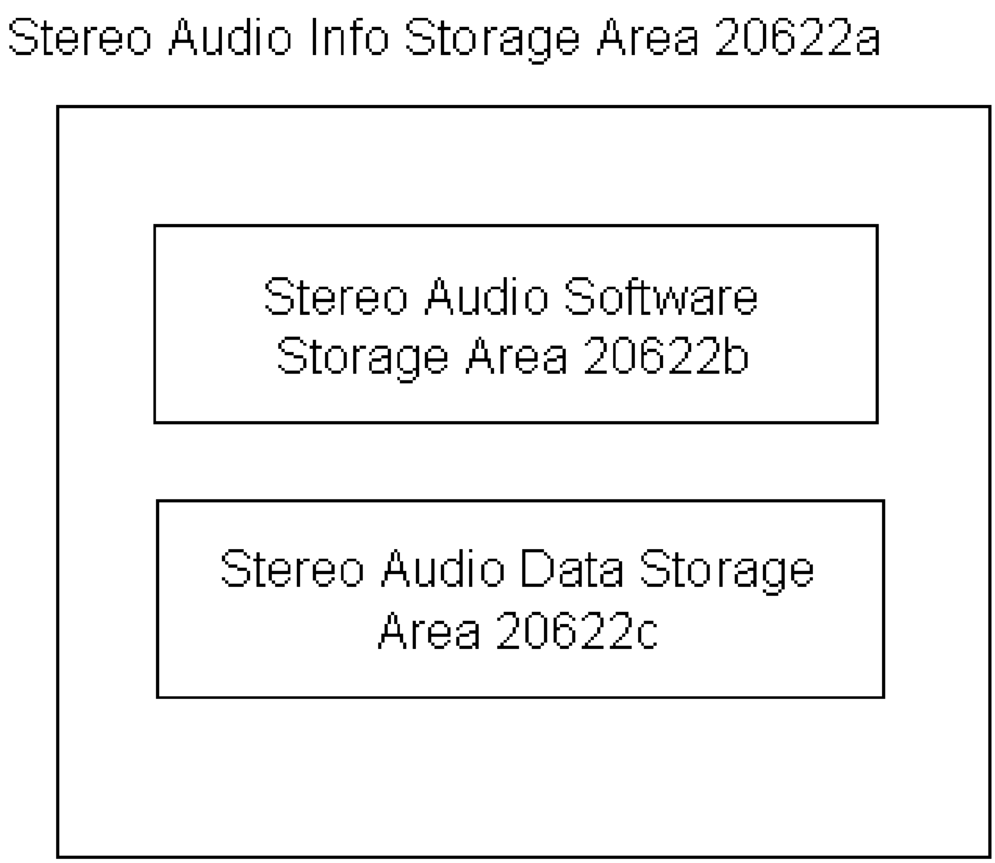

FIG. 475 is a block diagram illustrating an exemplary embodiment of the present invention.

Figure 476:
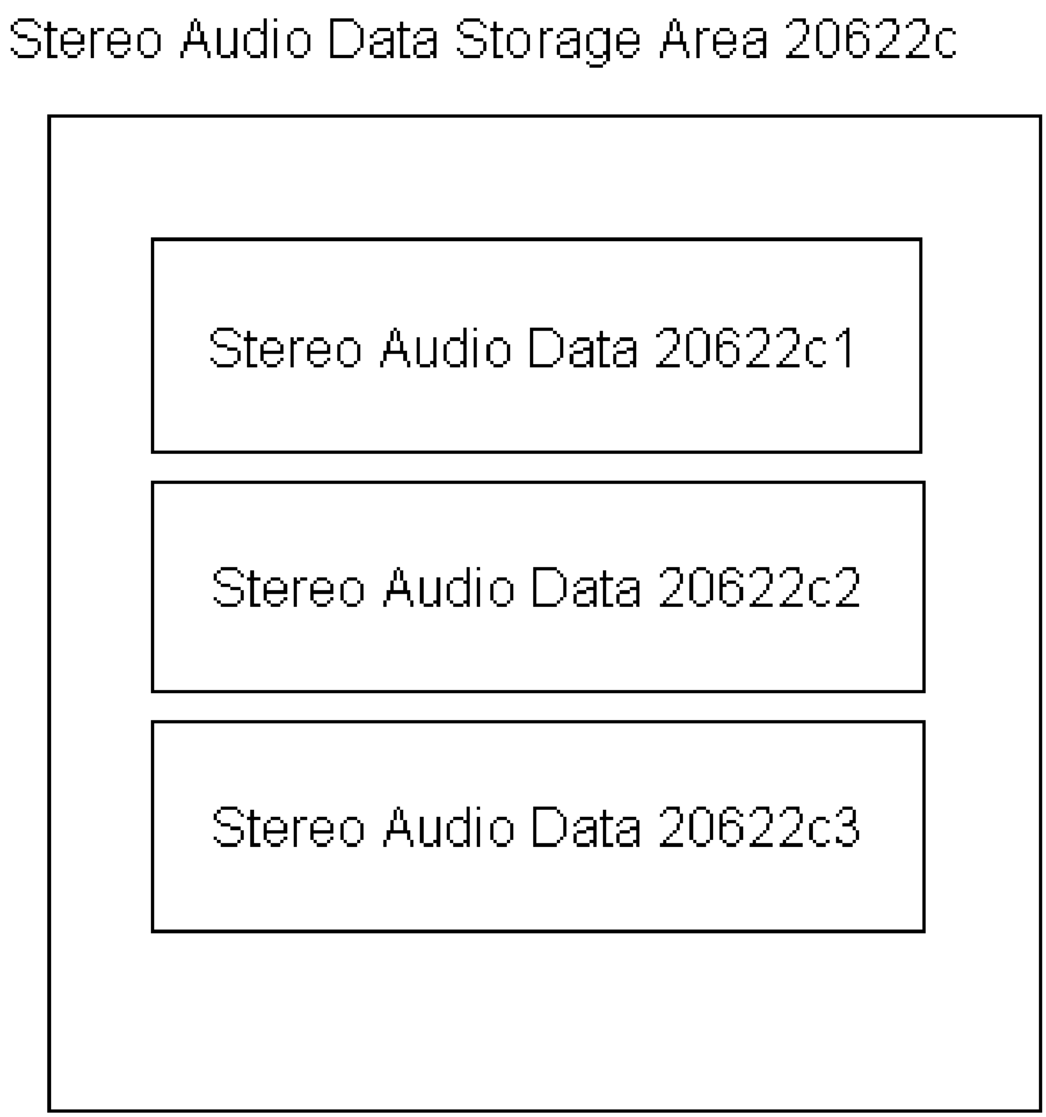

FIG. 476 is a block diagram illustrating an exemplary embodiment of the present invention.

Figure 477:
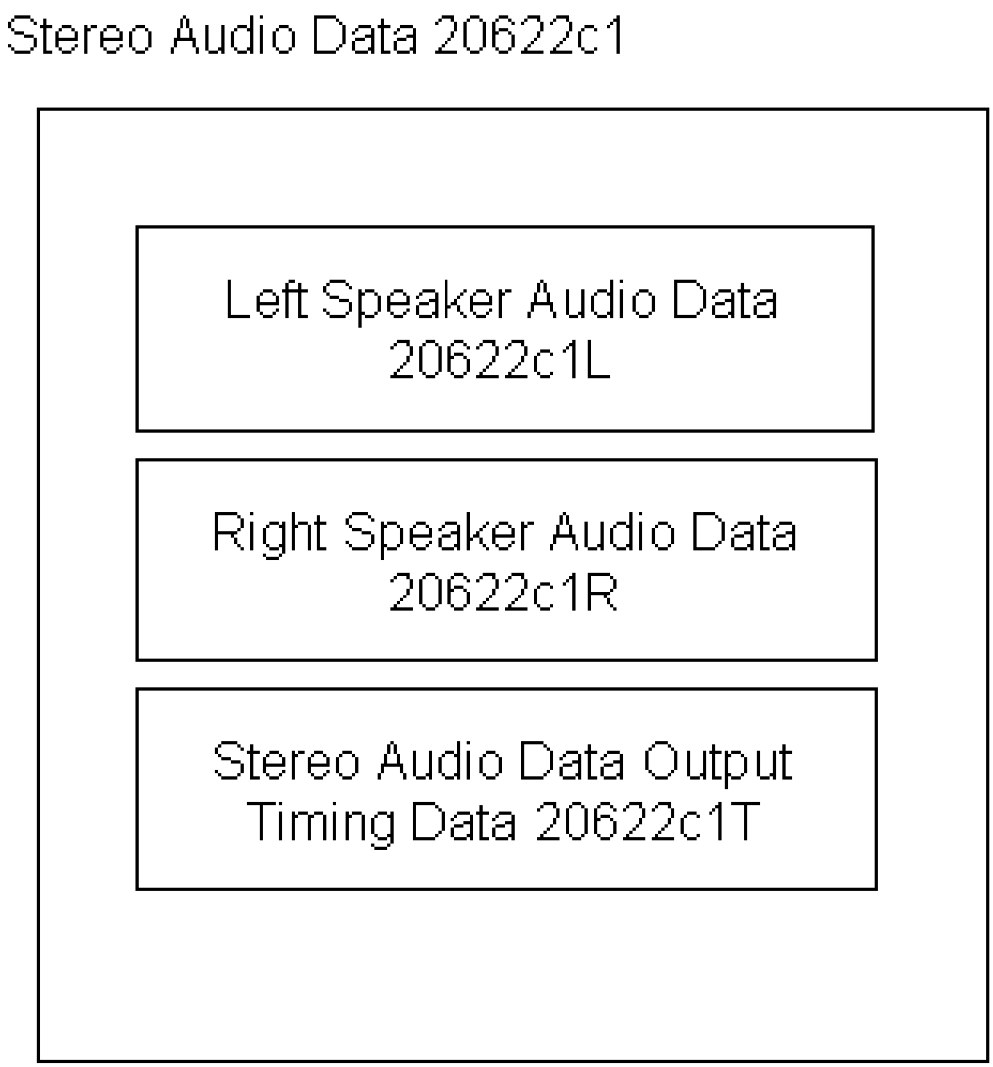

FIG. 477 is a block diagram illustrating an exemplary embodiment of the present invention.

Figure 478:
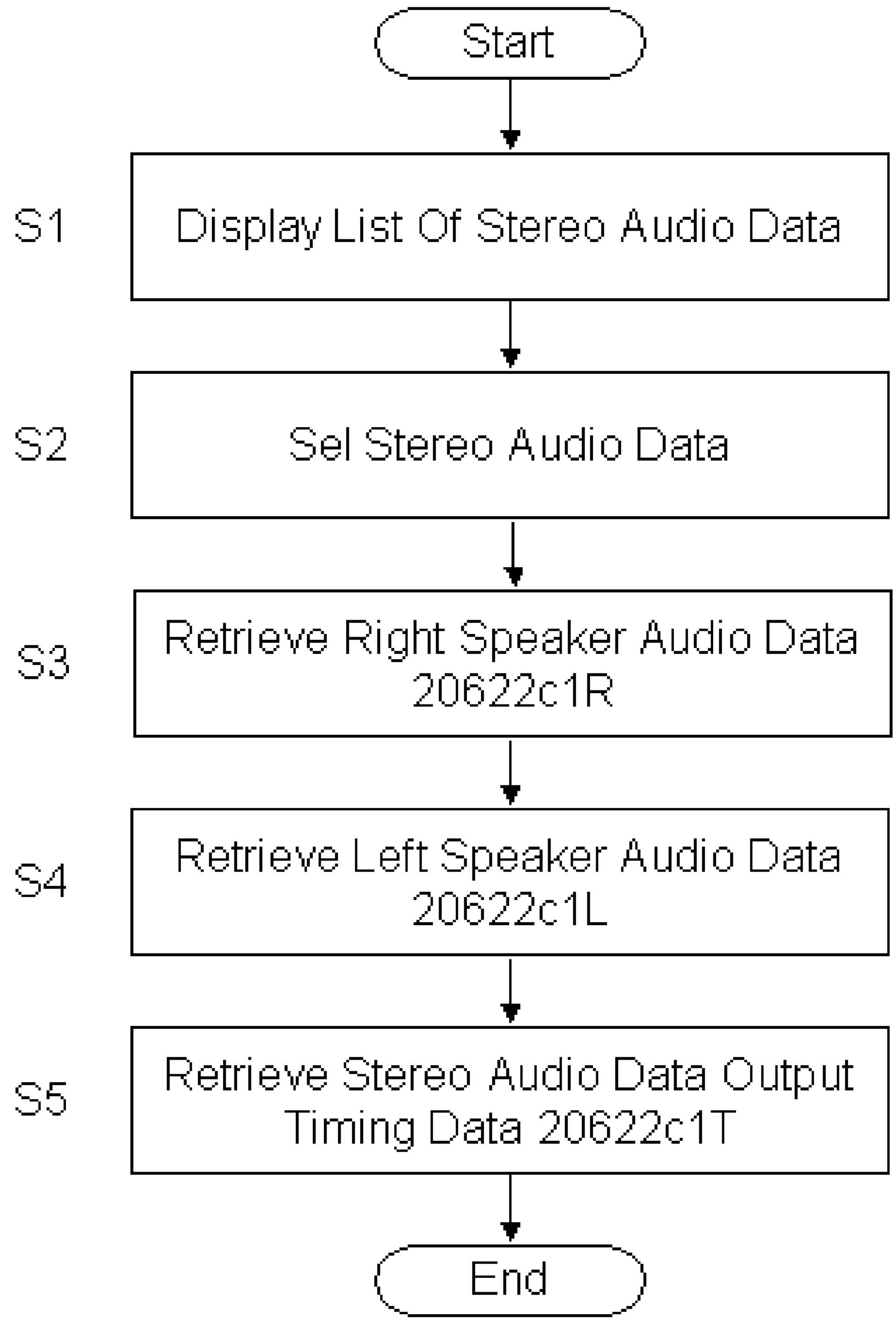

FIG. 478 is a flowchart illustrating an exemplary embodiment of the present invention.

Figure 479:
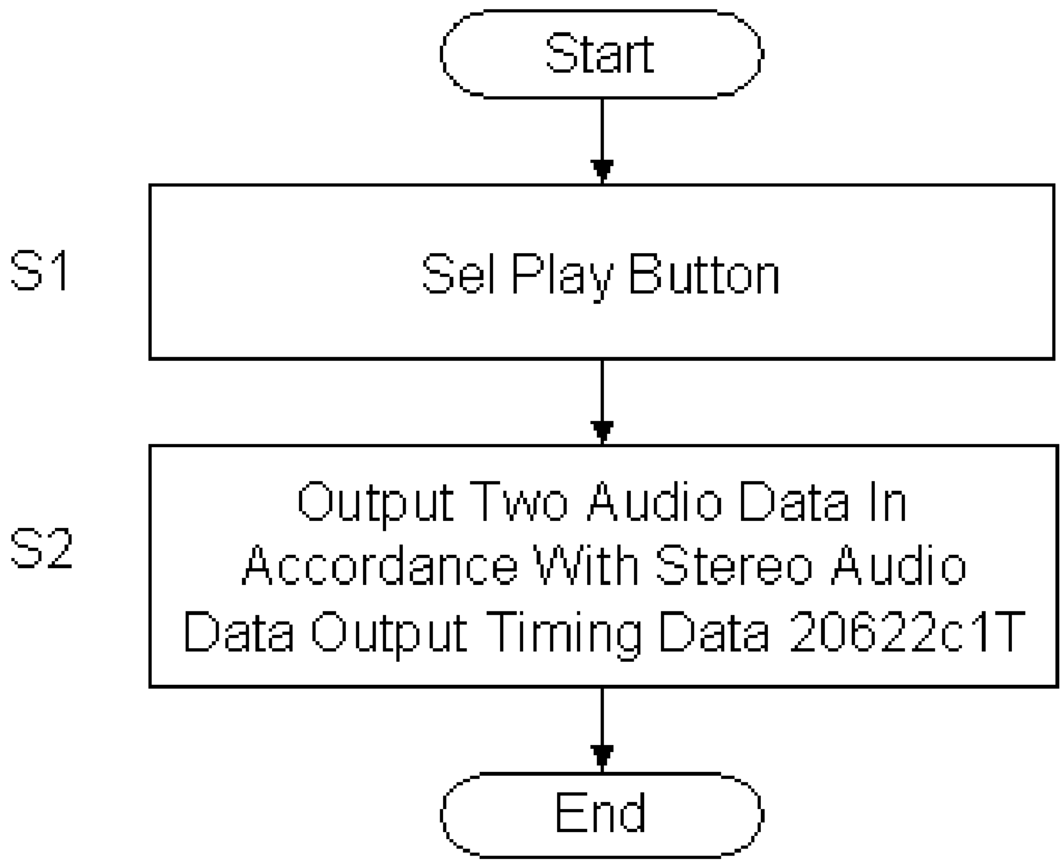

FIG. 479 is a flowchart illustrating an exemplary embodiment of the present invention.

Figure 480:
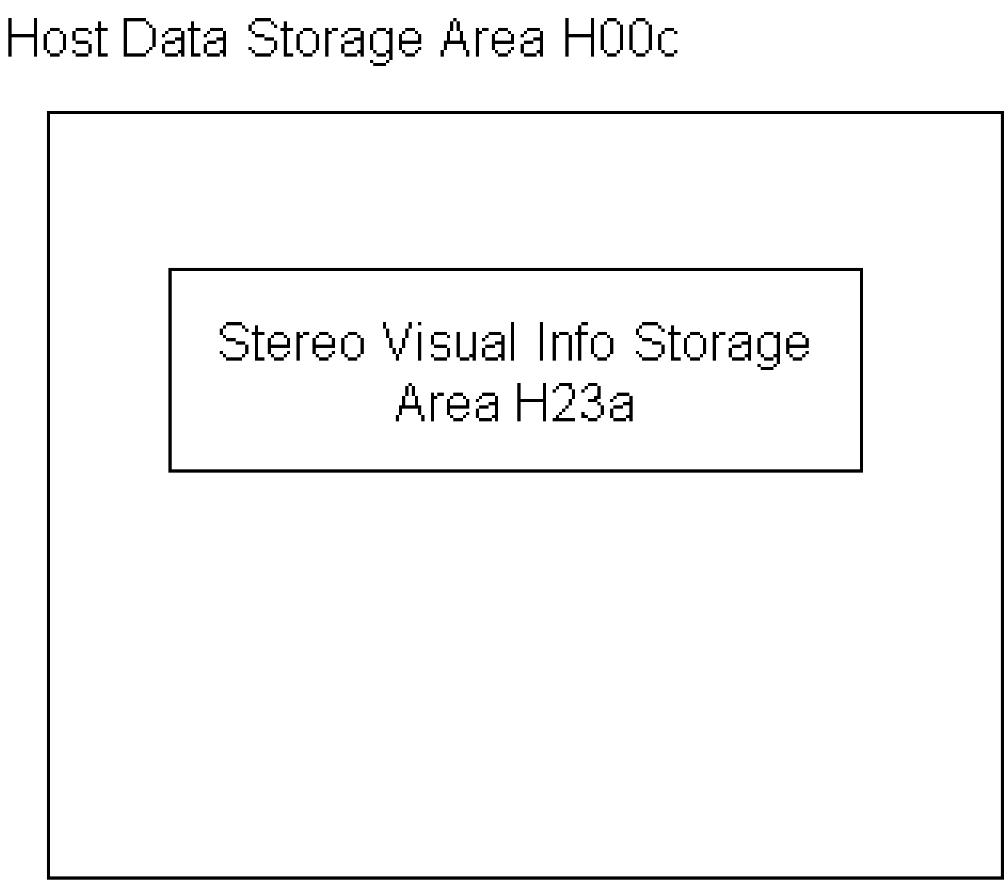

FIG. 480 is a block diagram illustrating an exemplary embodiment of the present invention.

Figure 481:
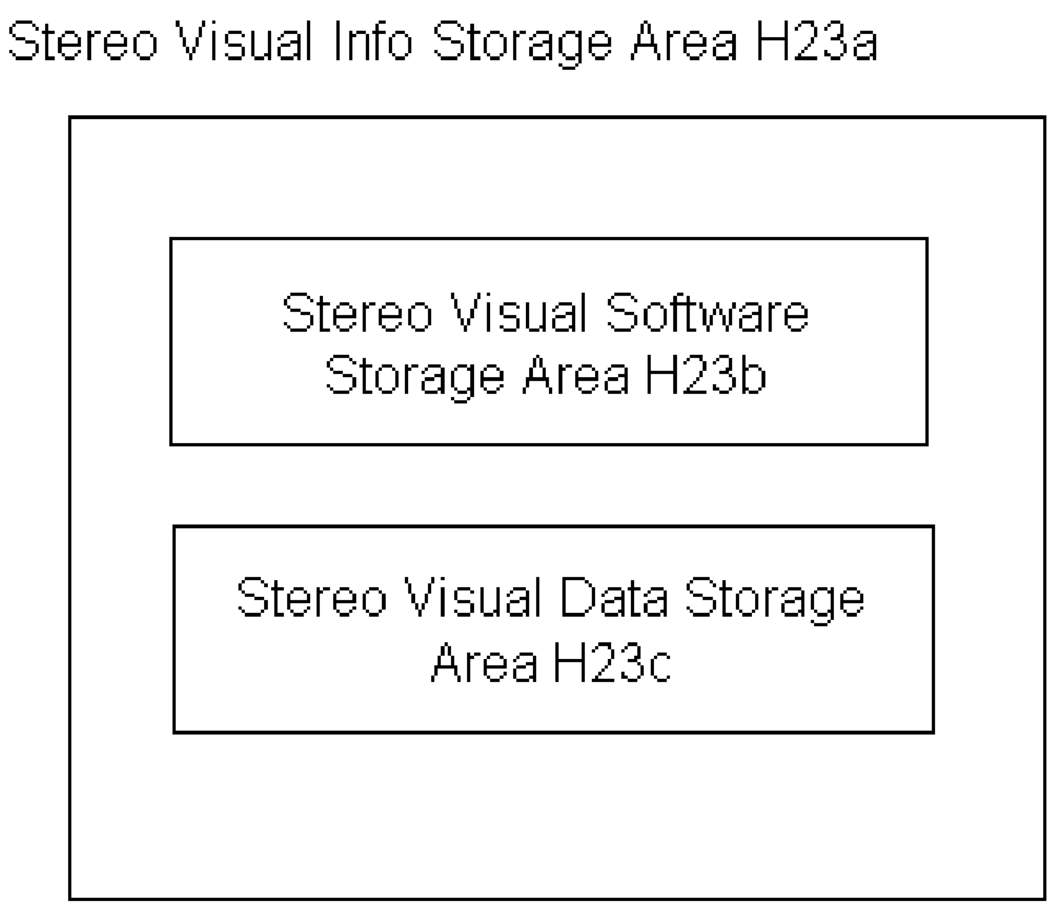

FIG. 481 is a block diagram illustrating an exemplary embodiment of the present invention.

Figure 482:
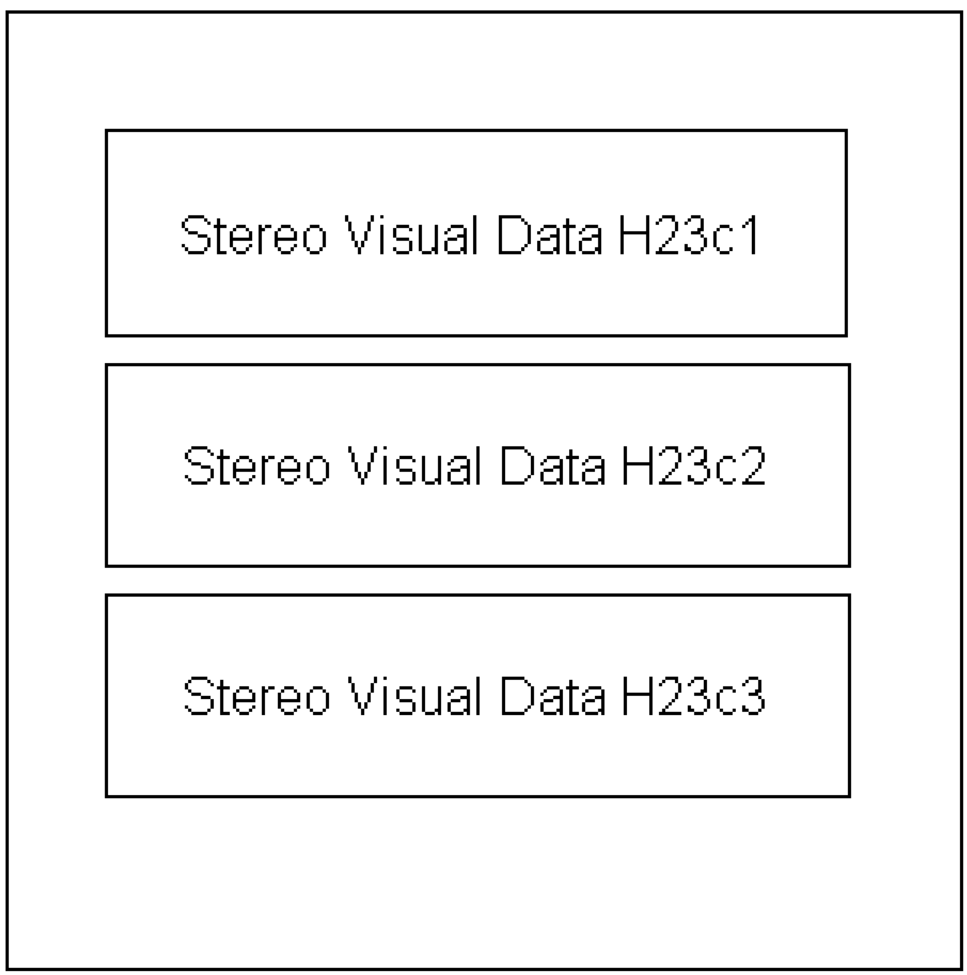

FIG. 482 is a block diagram illustrating an exemplary embodiment of the present invention.

Figure 483:
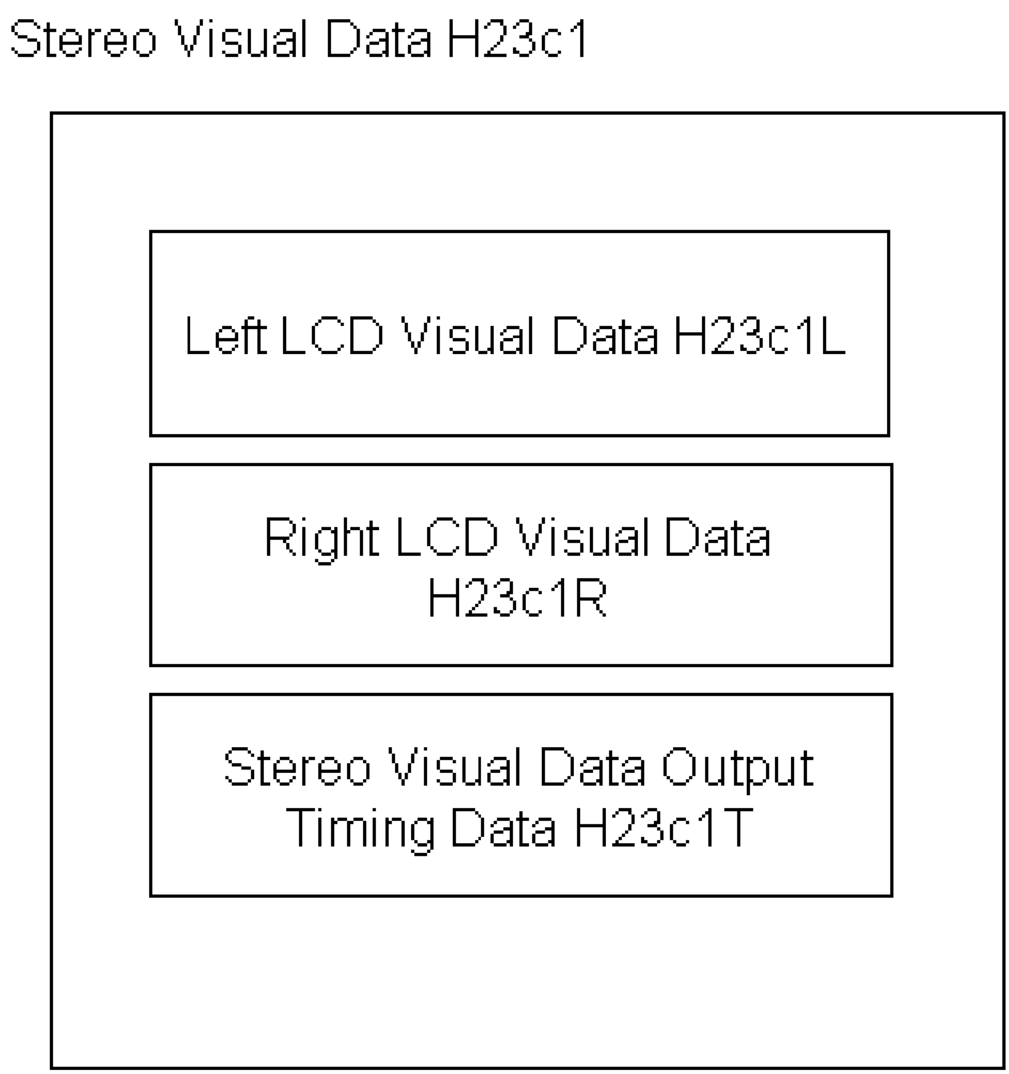

FIG. 483 is a block diagram illustrating an exemplary embodiment of the present invention.

Figure 484:
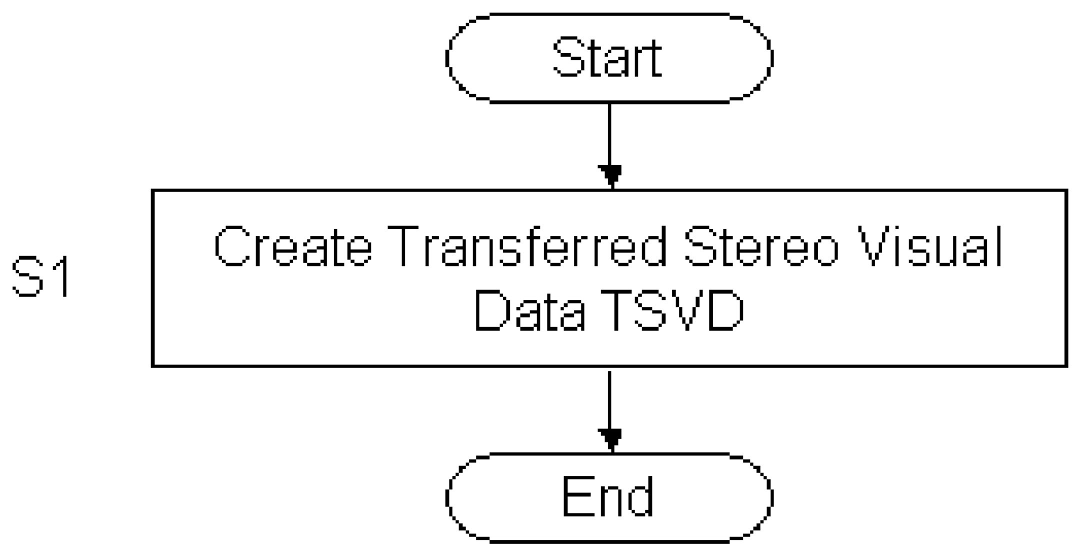

FIG. 484 is a flowchart illustrating an exemplary embodiment of the present invention.

Figure 485:
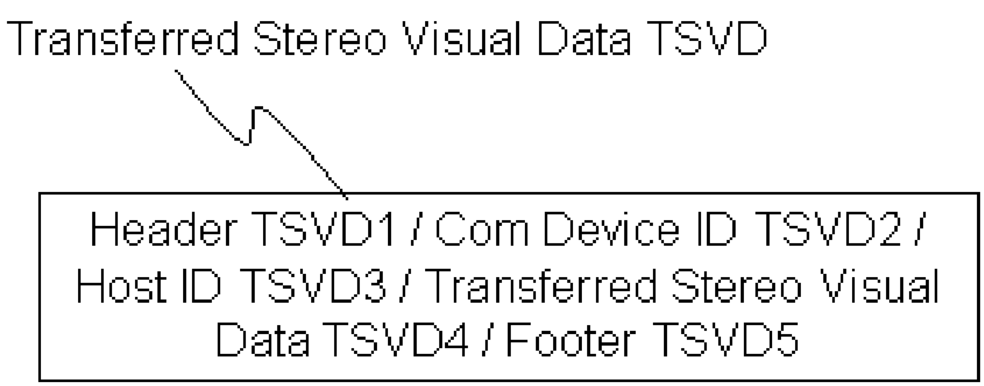

FIG. 485 is a simplified illustration of data utilized in the present invention.

Figure 486:
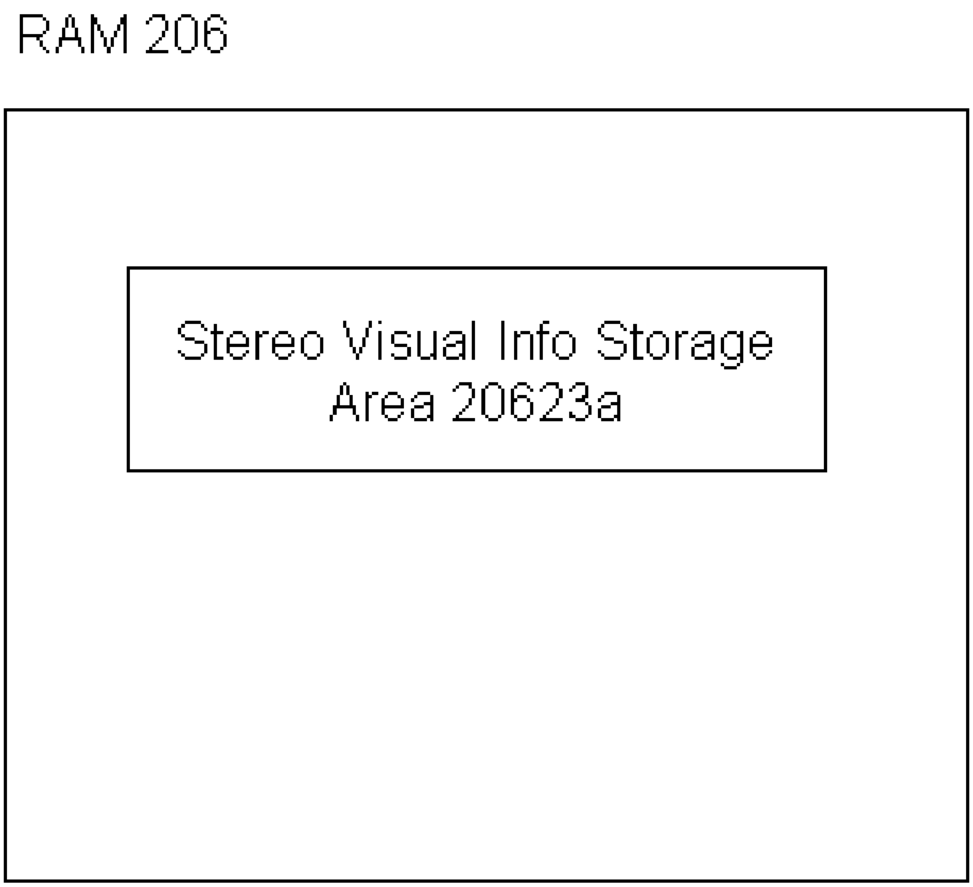

FIG. 486 is a block diagram illustrating an exemplary embodiment of the present invention.

Figure 487:
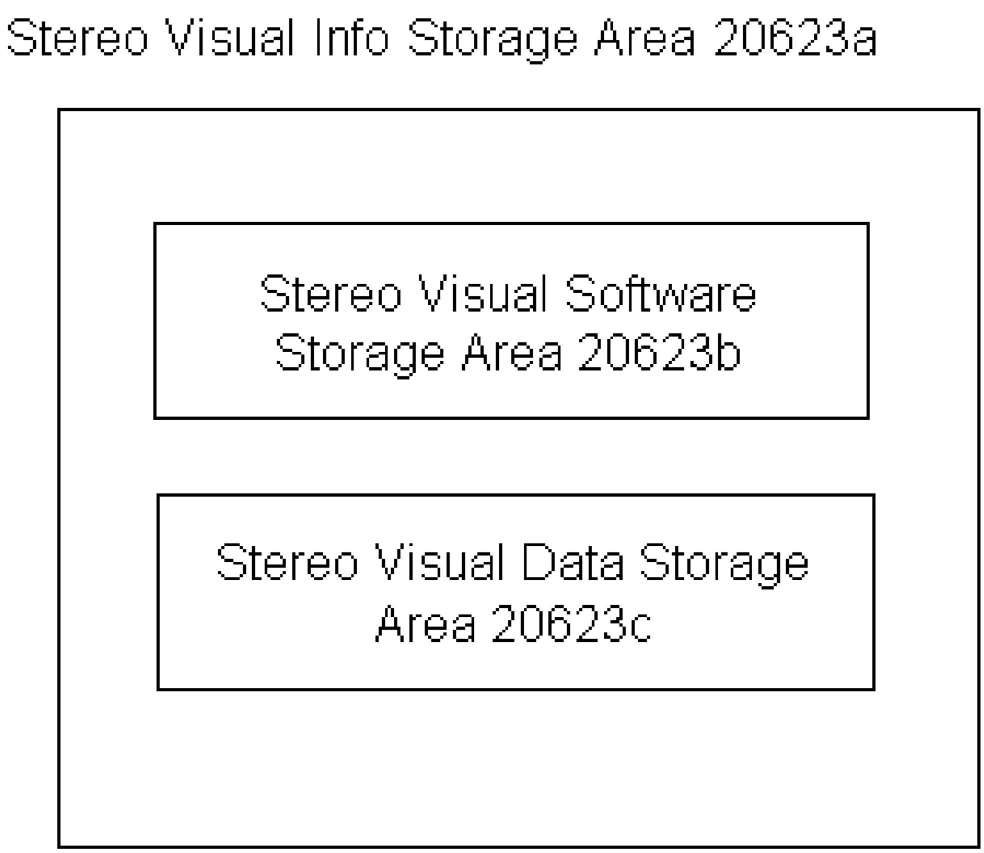

FIG. 487 is a block diagram illustrating an exemplary embodiment of the present invention.

Figure 488:
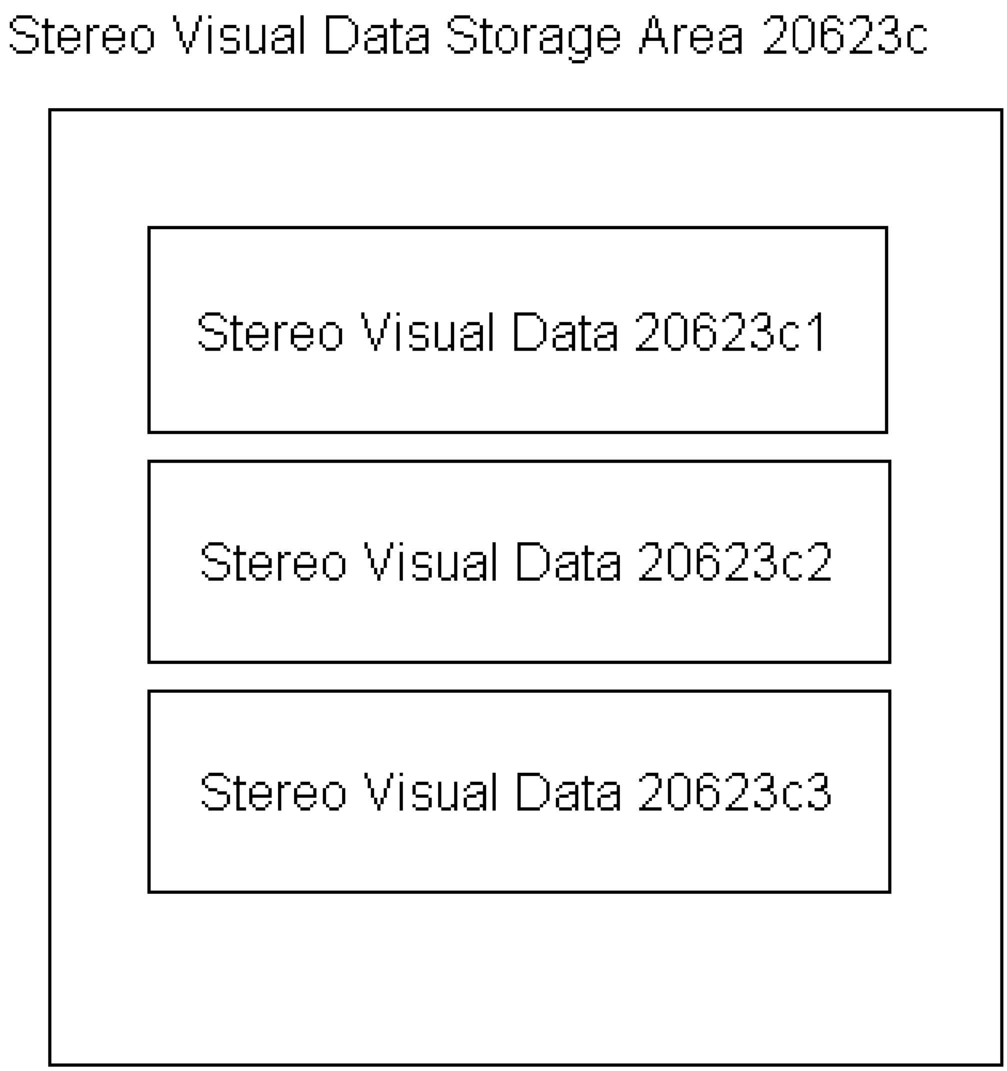

FIG. 488 is a block diagram illustrating an exemplary embodiment of the present invention.

Figure 489:
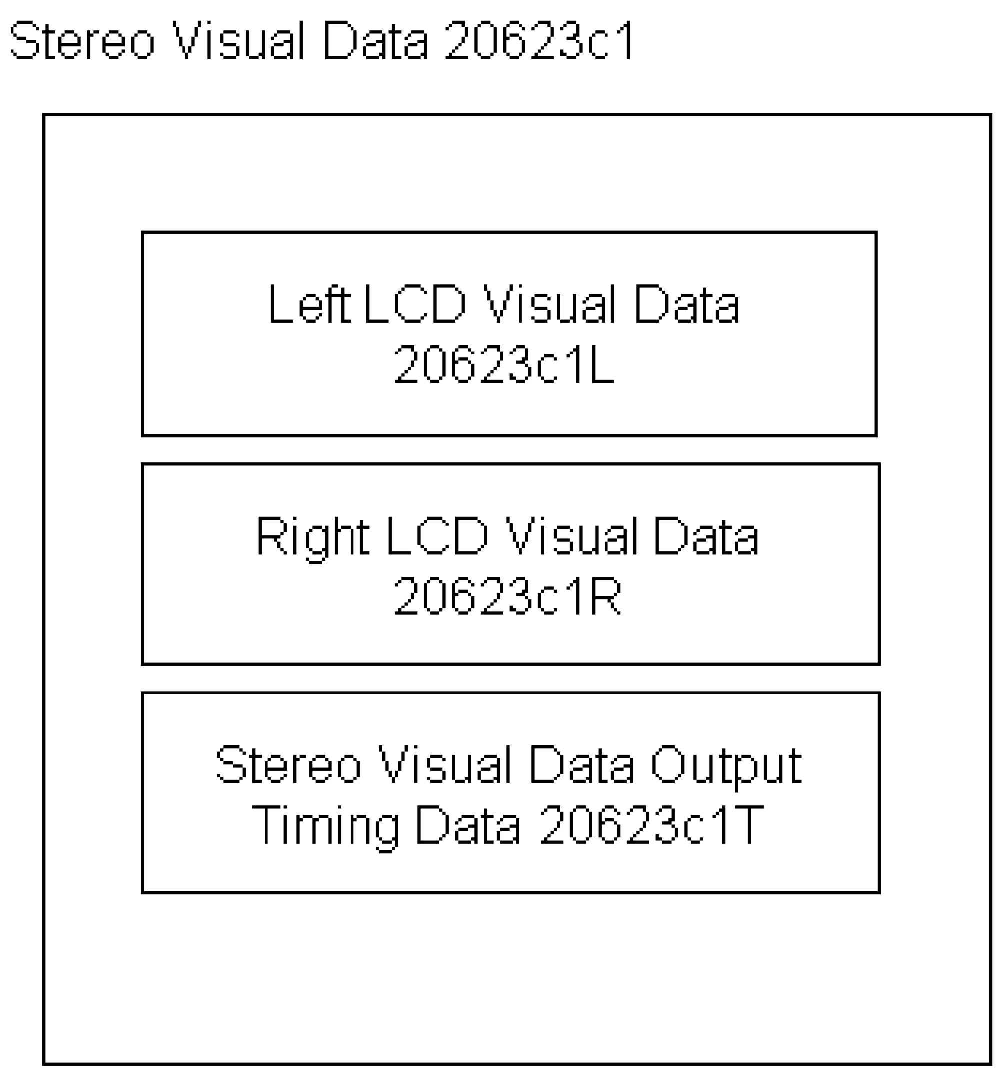

FIG. 489 is a block diagram illustrating an exemplary embodiment of the present invention.

Figure 490:
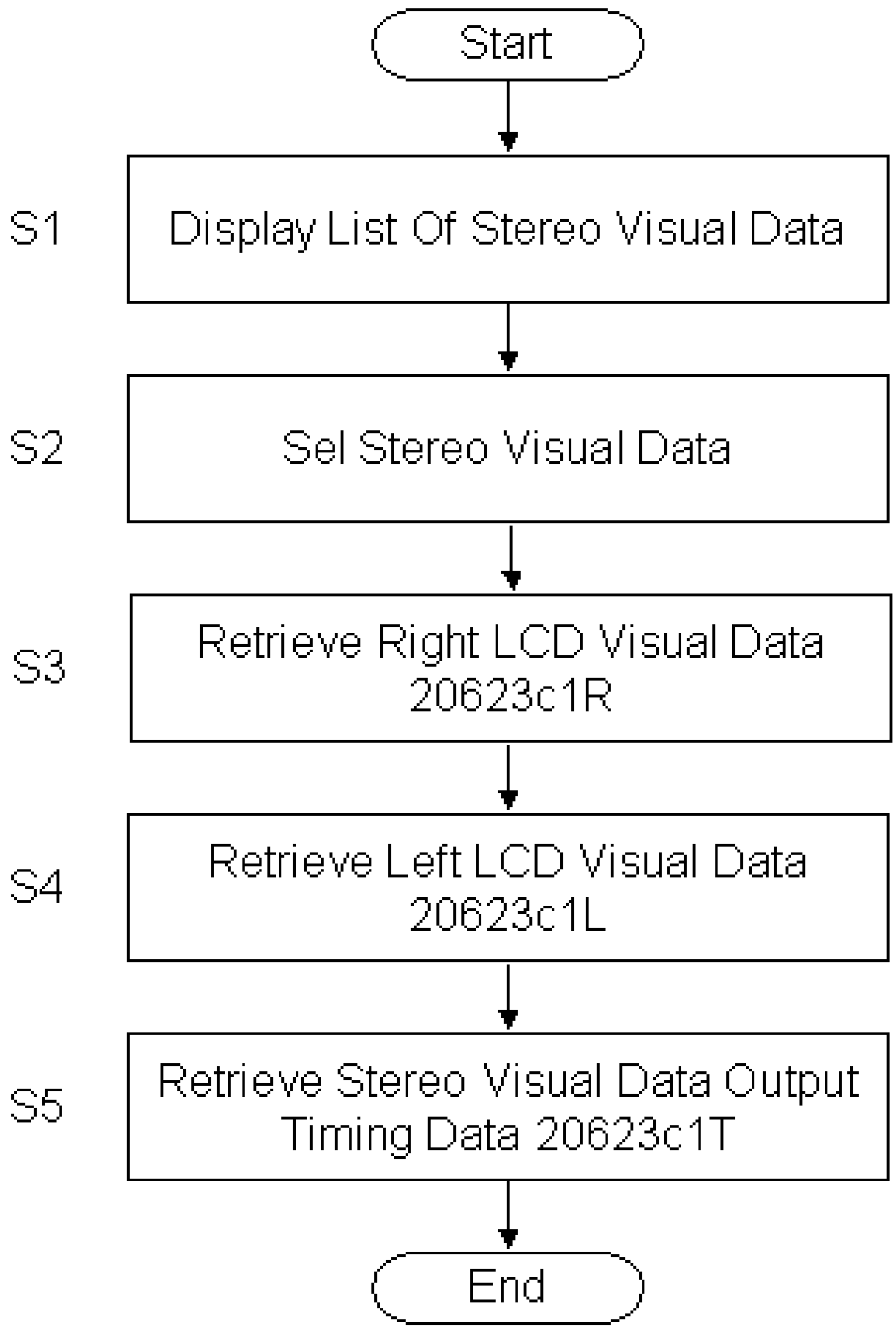

FIG. 490 is a flowchart illustrating an exemplary embodiment of the present invention.

Figure 491:
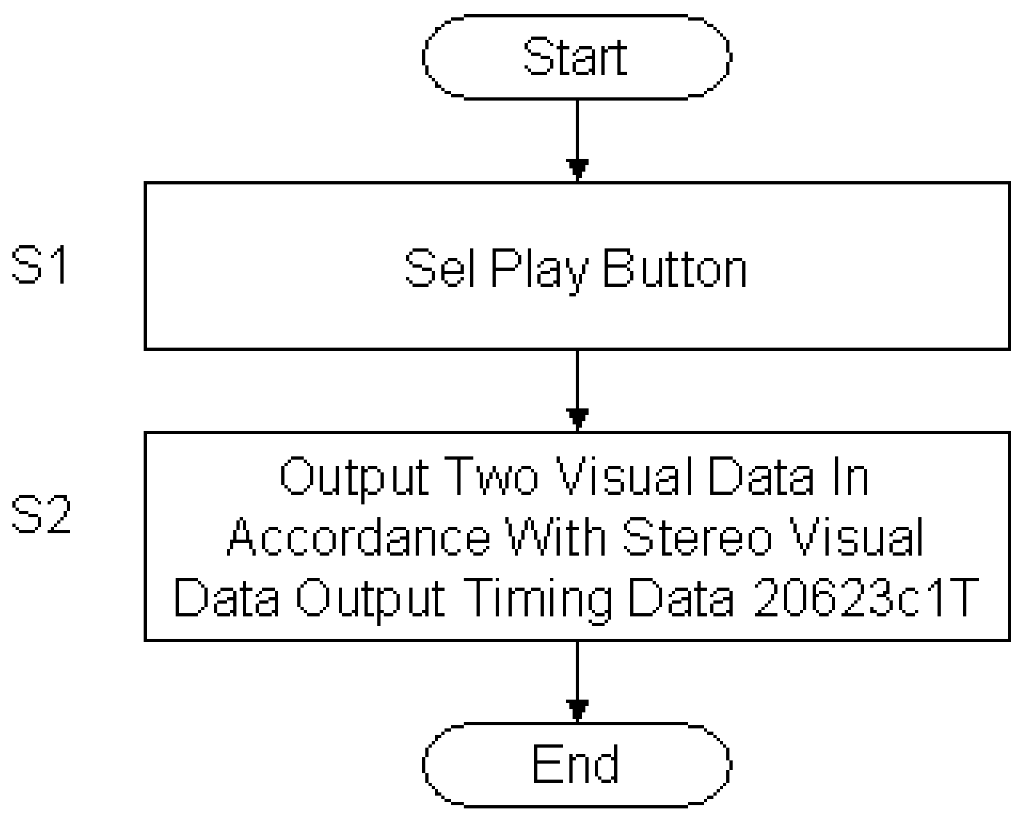

FIG. 491 is a flowchart illustrating an exemplary embodiment of the present invention.

Figure 492:
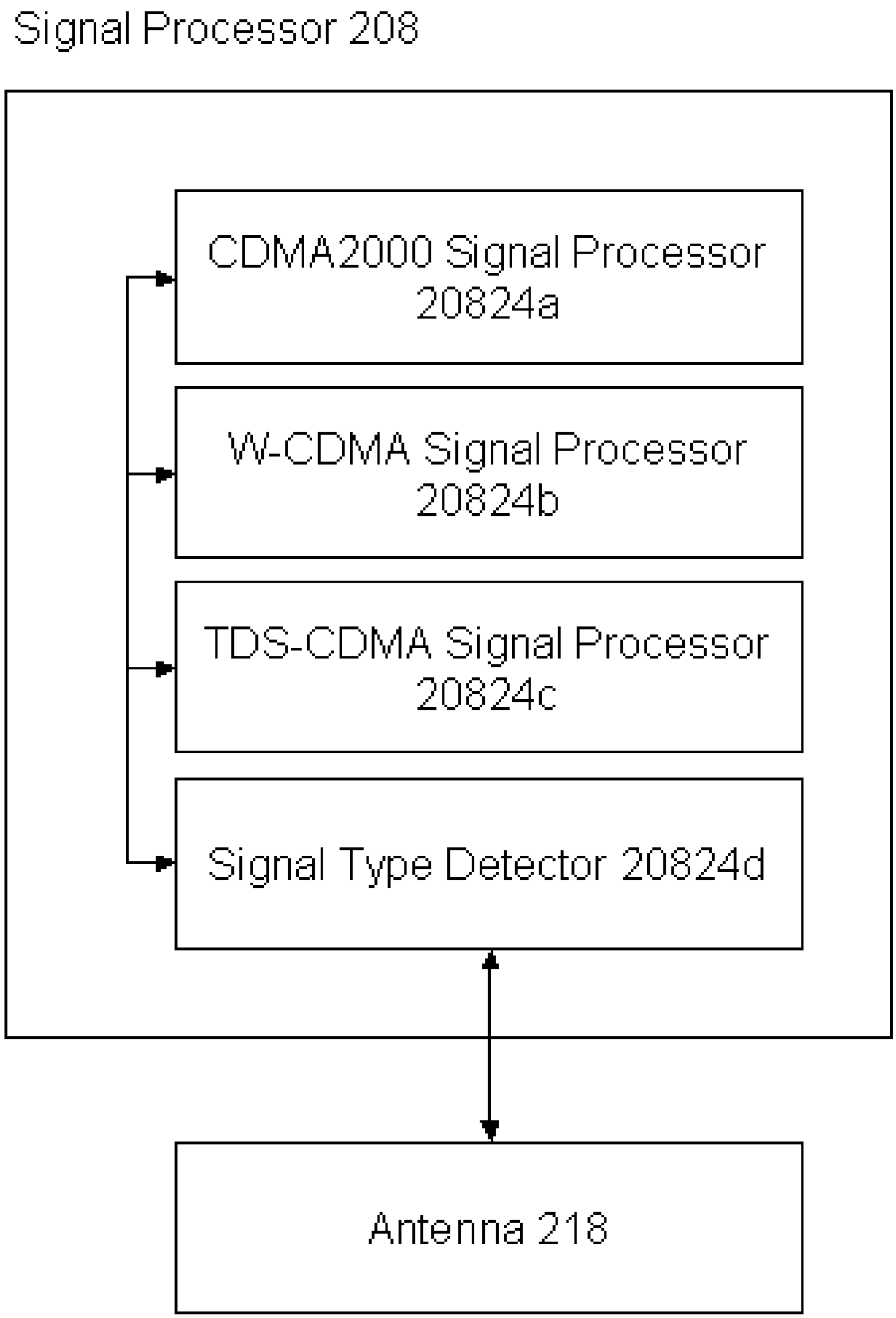

FIG. 492 is a block diagram illustrating an exemplary embodiment of the present invention.

Figure 493:
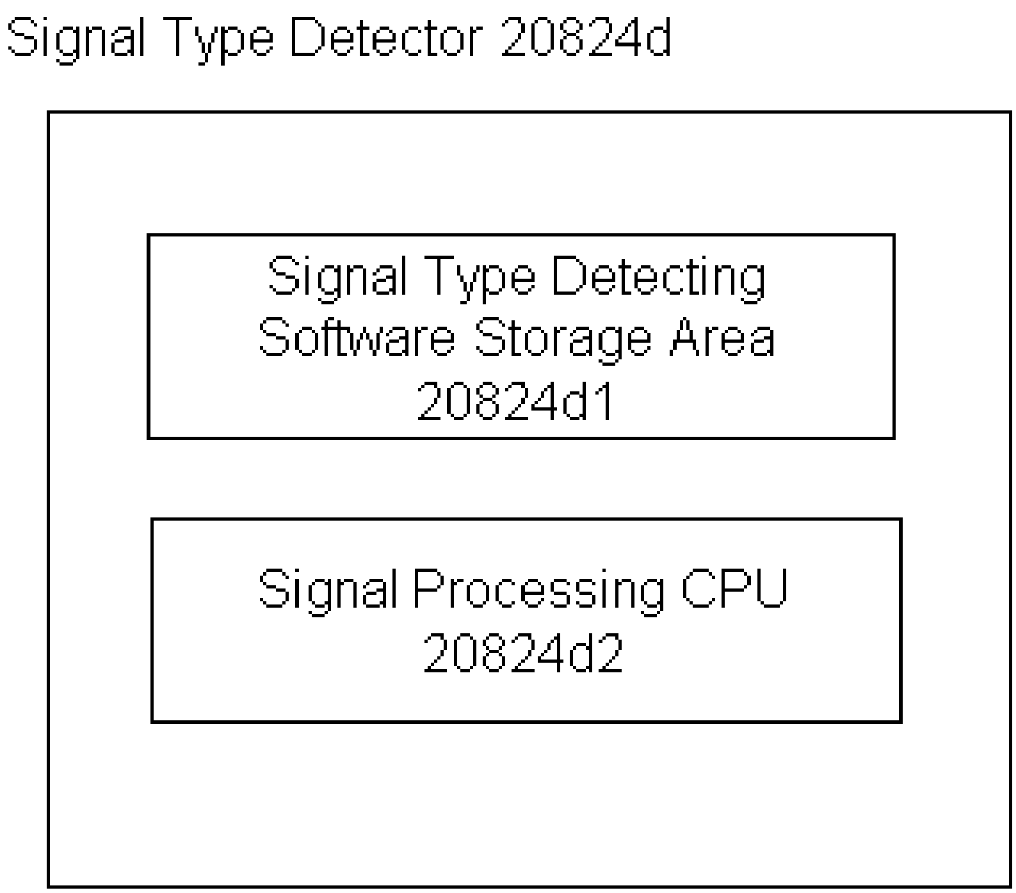

FIG. 493 is a block diagram illustrating an exemplary embodiment of the present invention.

Figure 493A:
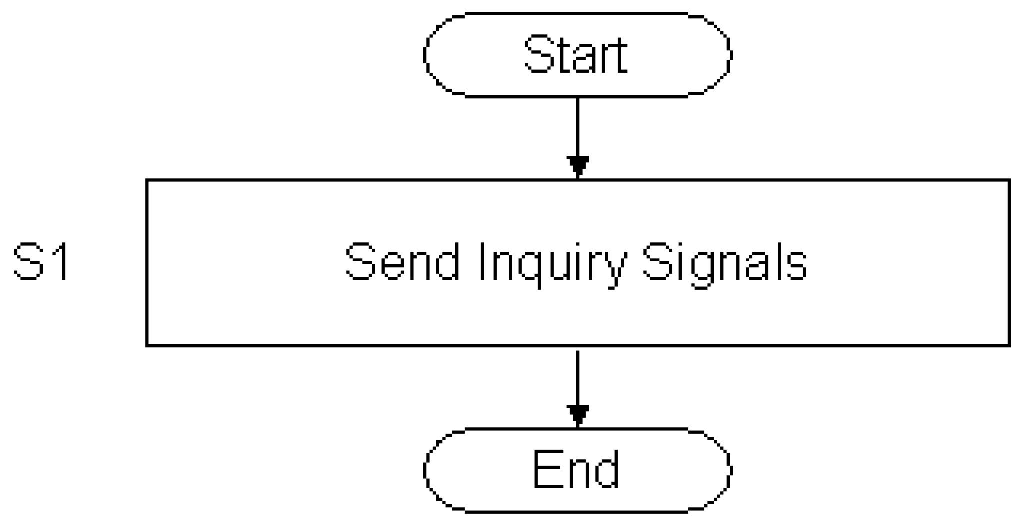

FIG. 493*a* is a flowchart illustrating an exemplary embodiment of the present invention.

Figure 494:
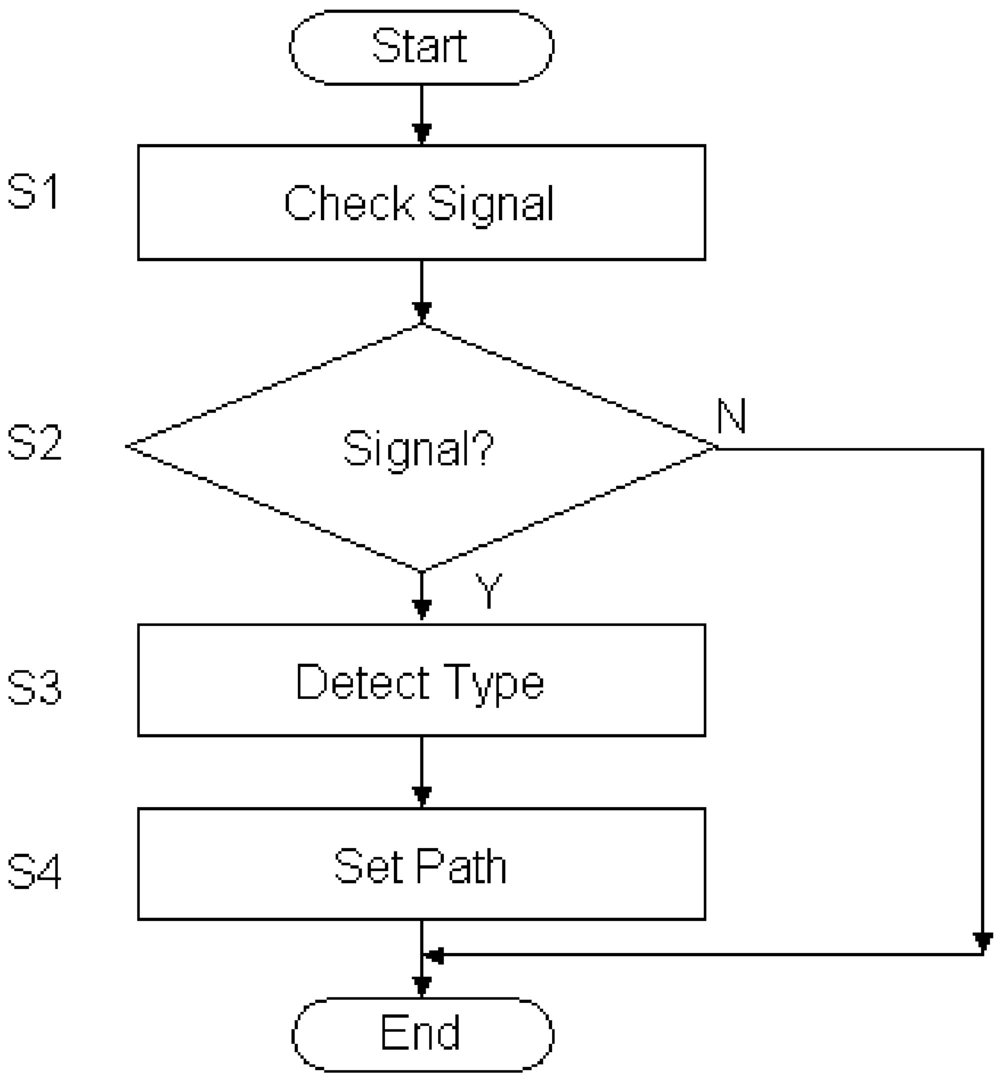

FIG. 494 is a flowchart illustrating an exemplary embodiment of the present invention.

Figure 495:
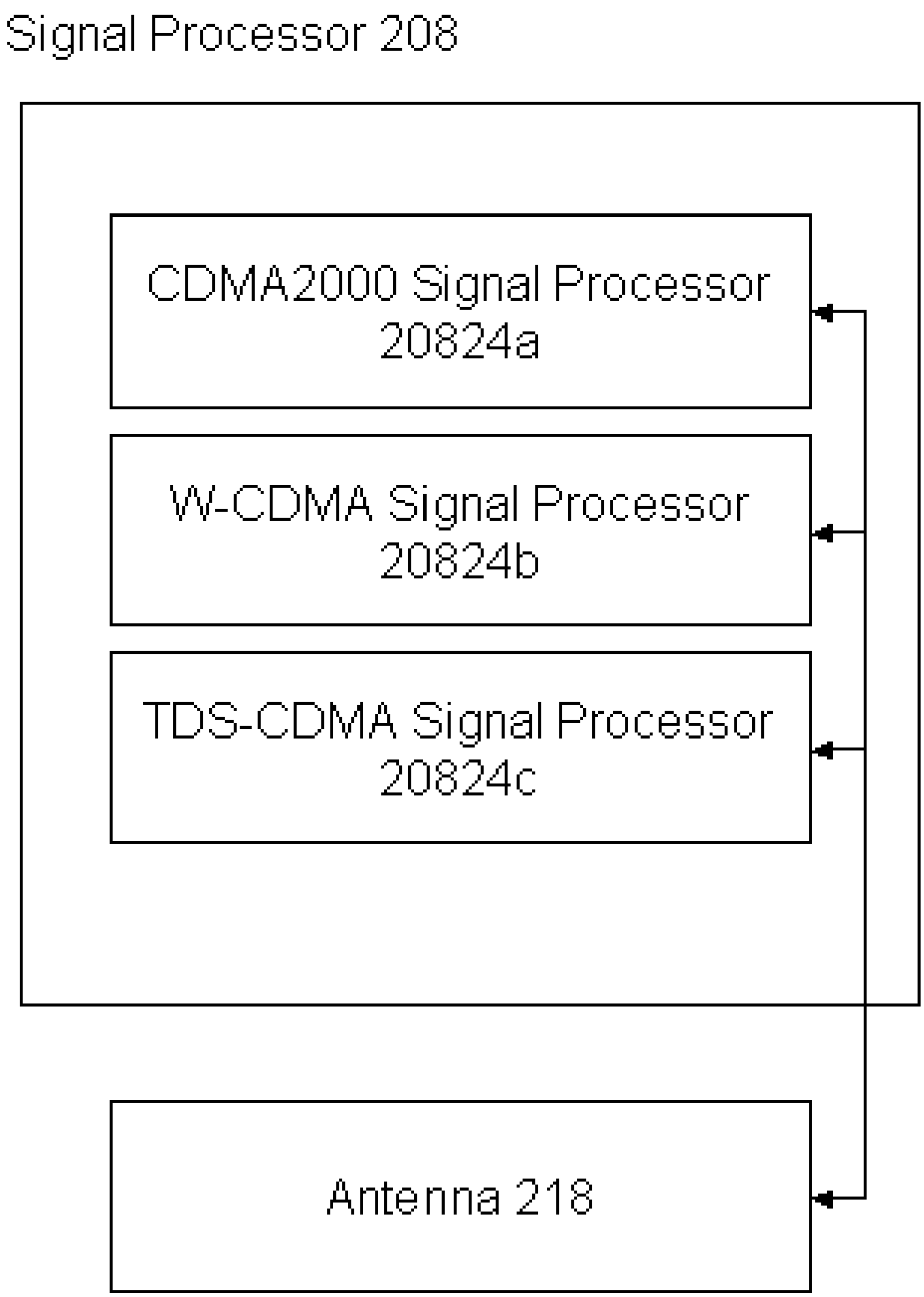

FIG. 495 is a block diagram illustrating an exemplary embodiment of the present invention.

Figure 496:
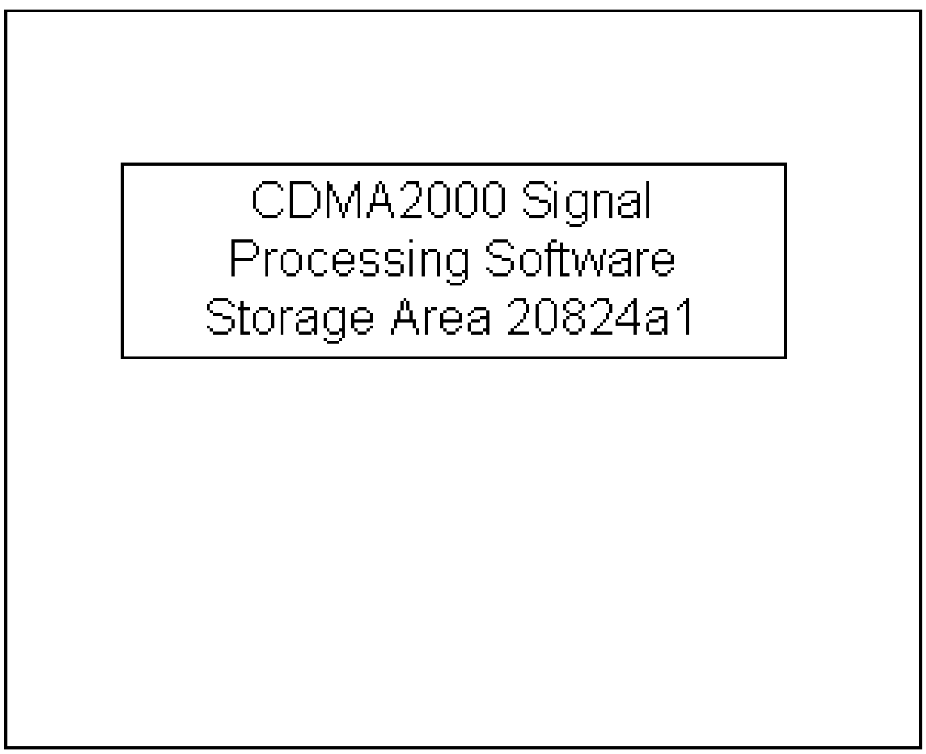

FIG. 496 is a block diagram illustrating an exemplary embodiment of the present invention.

Figure 496A:
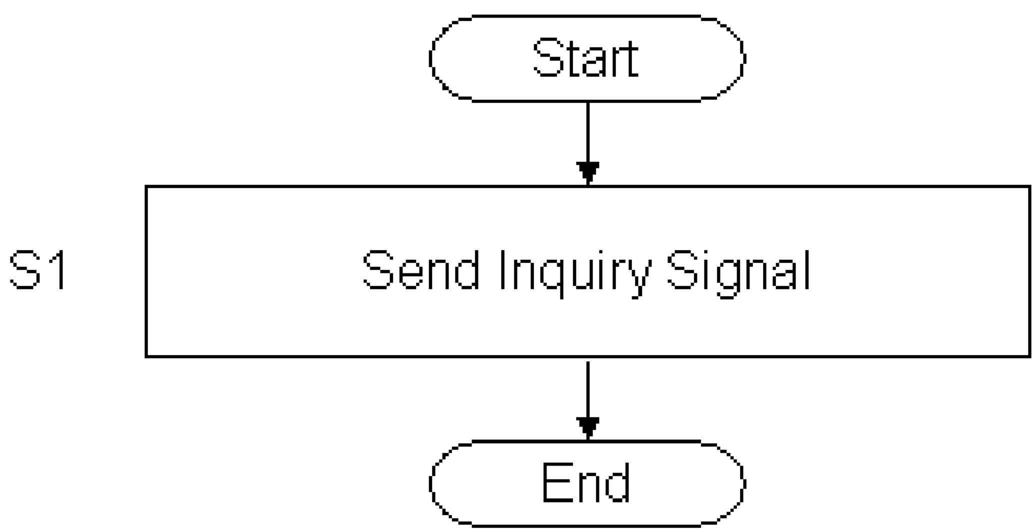

FIG. 496*a* is a flowchart illustrating an exemplary embodiment of the present invention.

Figure 497:
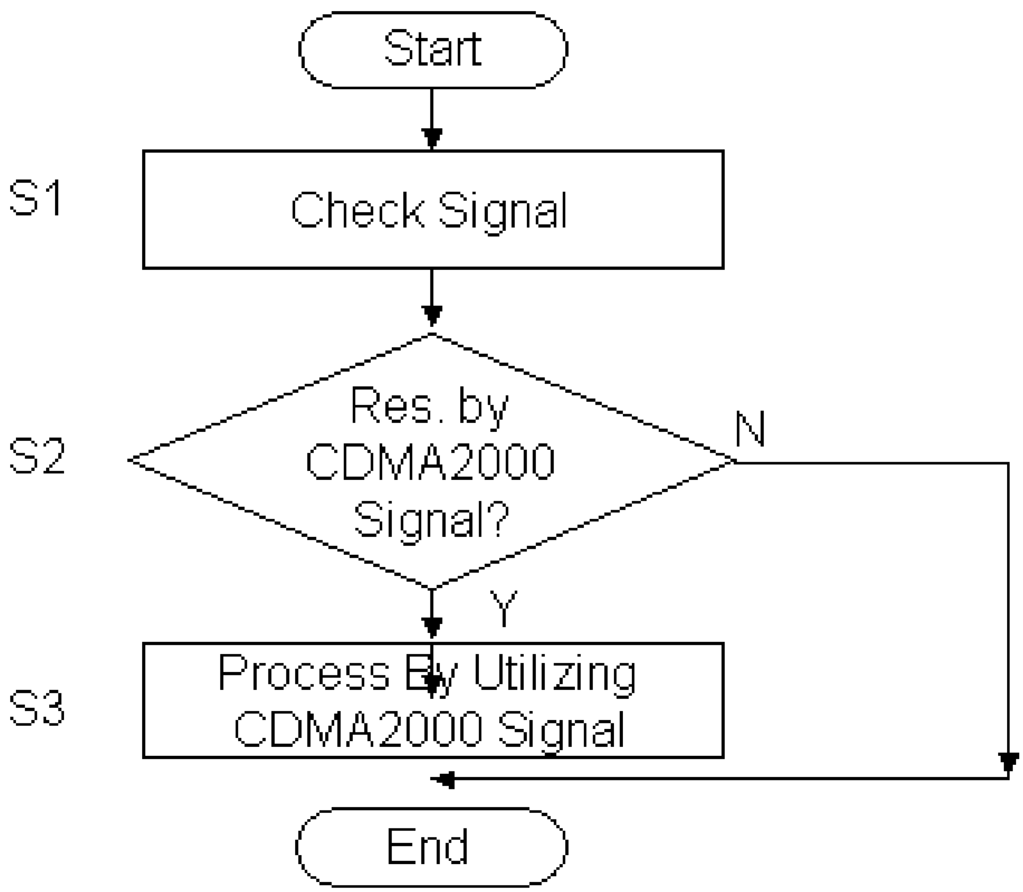

FIG. 497 is a flowchart illustrating an exemplary embodiment of the present invention.

Figure 498:
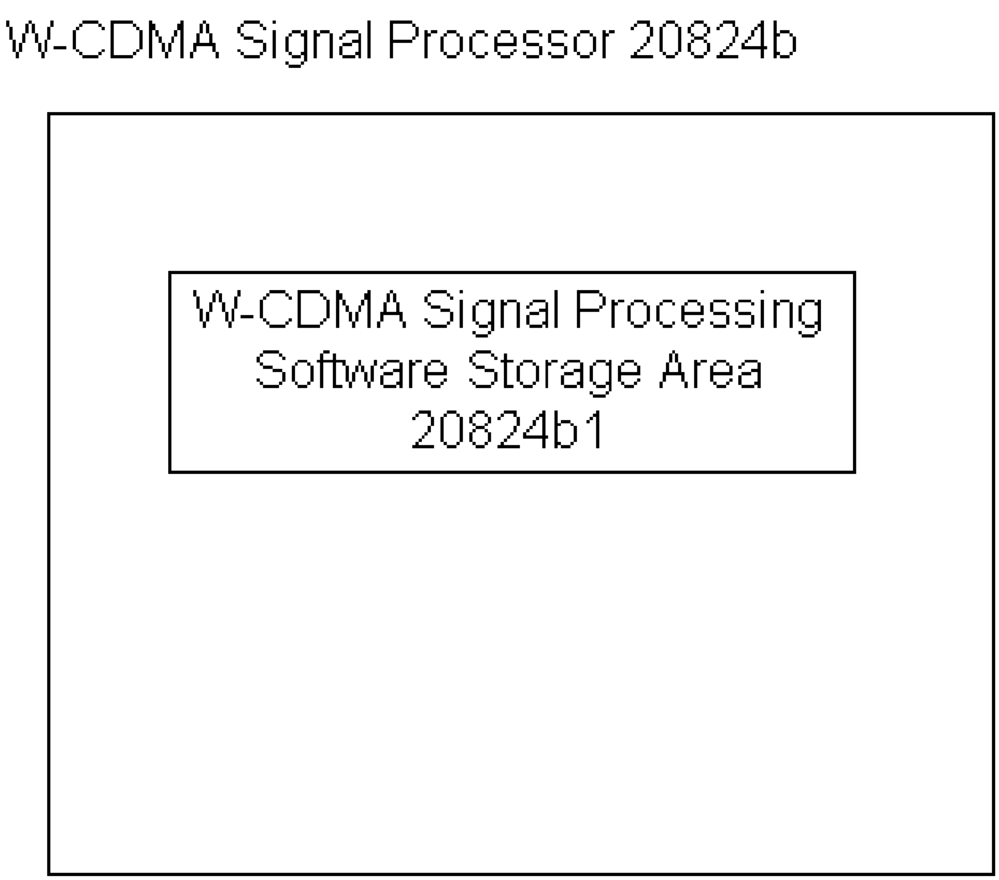

FIG. 498 is a block diagram illustrating an exemplary embodiment of the present invention.

Figure 498A:
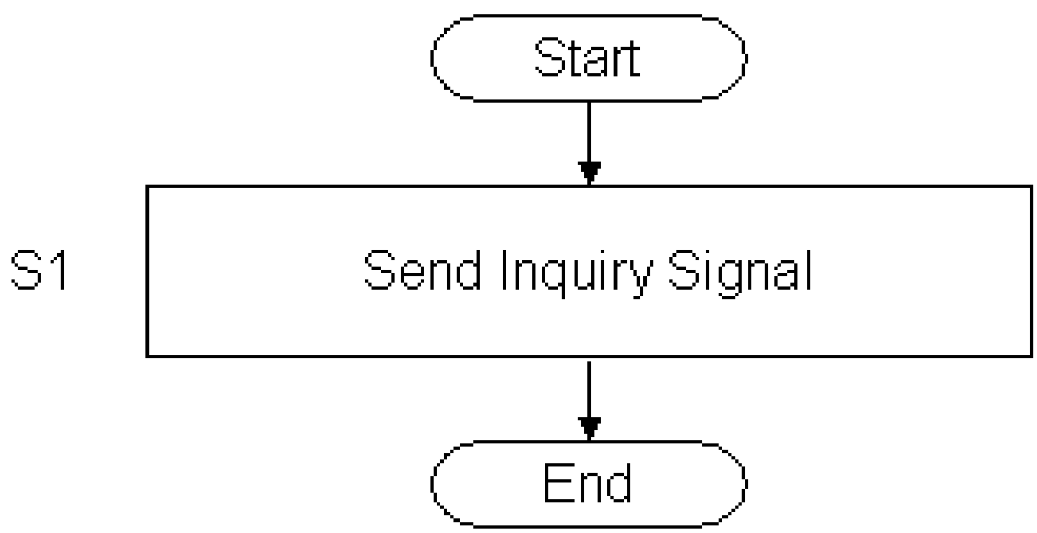

FIG. 498*a* is a flowchart illustrating an exemplary embodiment of the present invention.

Figure 499:
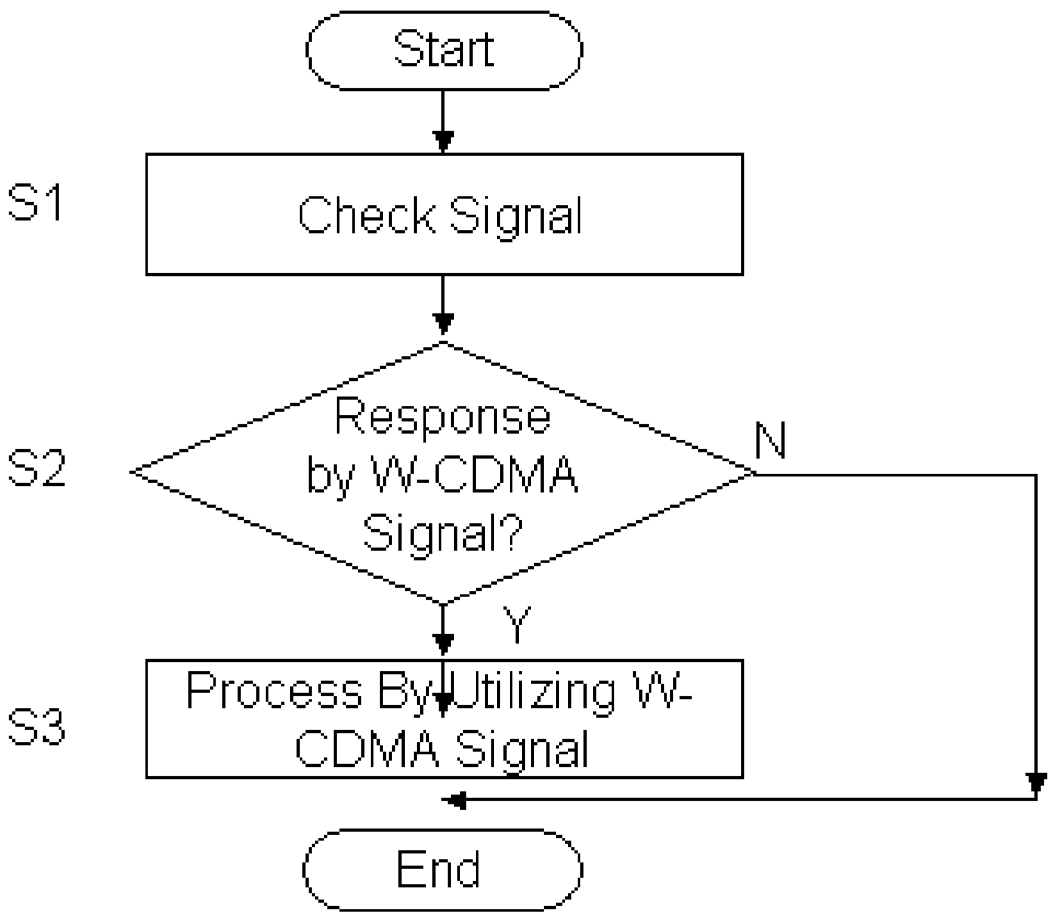

FIG. 499 is a flowchart illustrating an exemplary embodiment of the present invention.

Figure 500:
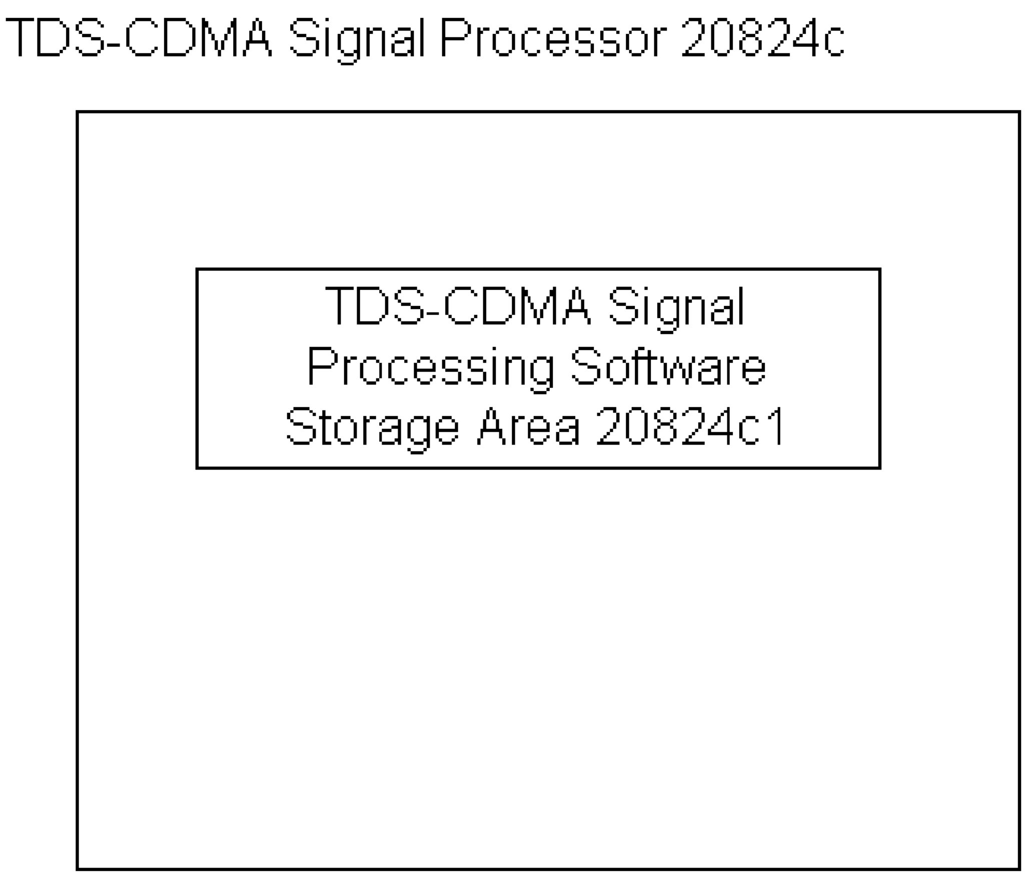

FIG. 500 is a block diagram illustrating an exemplary embodiment of the present invention.

Figure 500A:
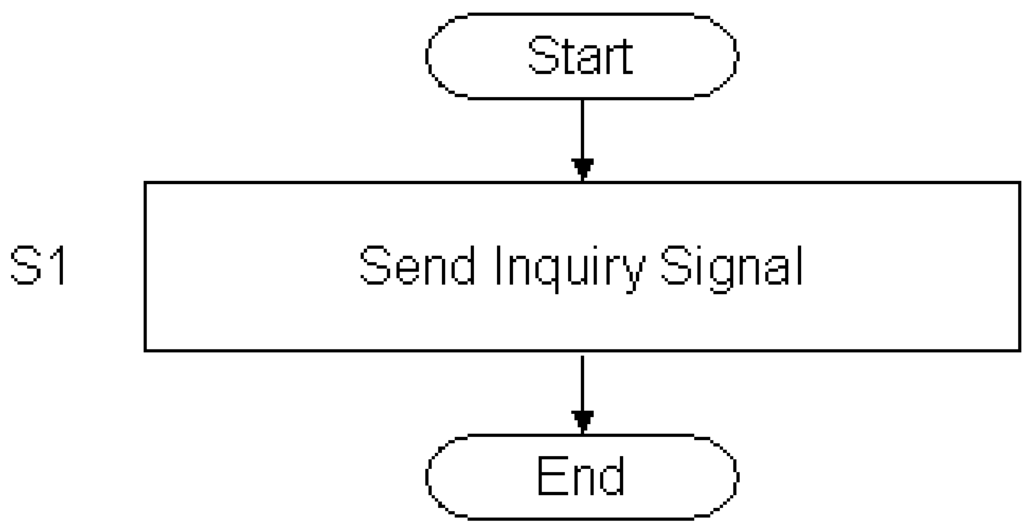

FIG. 500*a* is a flowchart illustrating an exemplary embodiment of the present invention.

Figure 501:
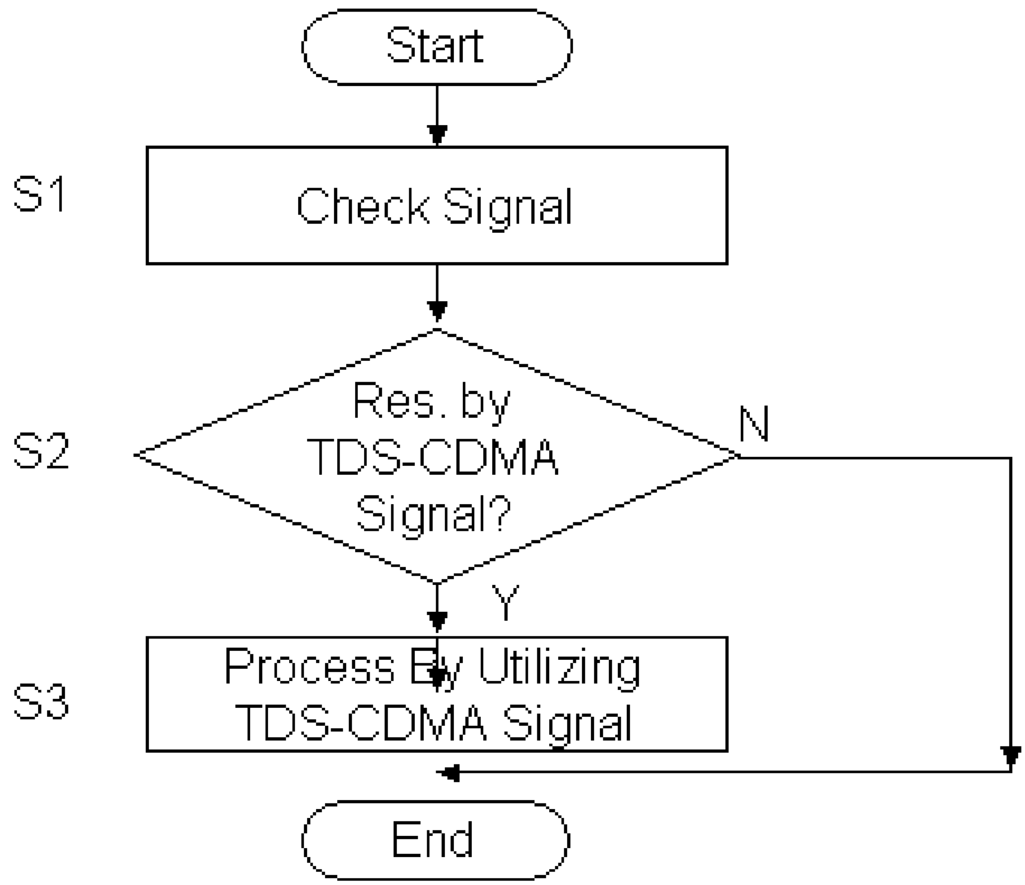

FIG. 501 is a flowchart illustrating an exemplary embodiment of the present invention.

Figure 502:
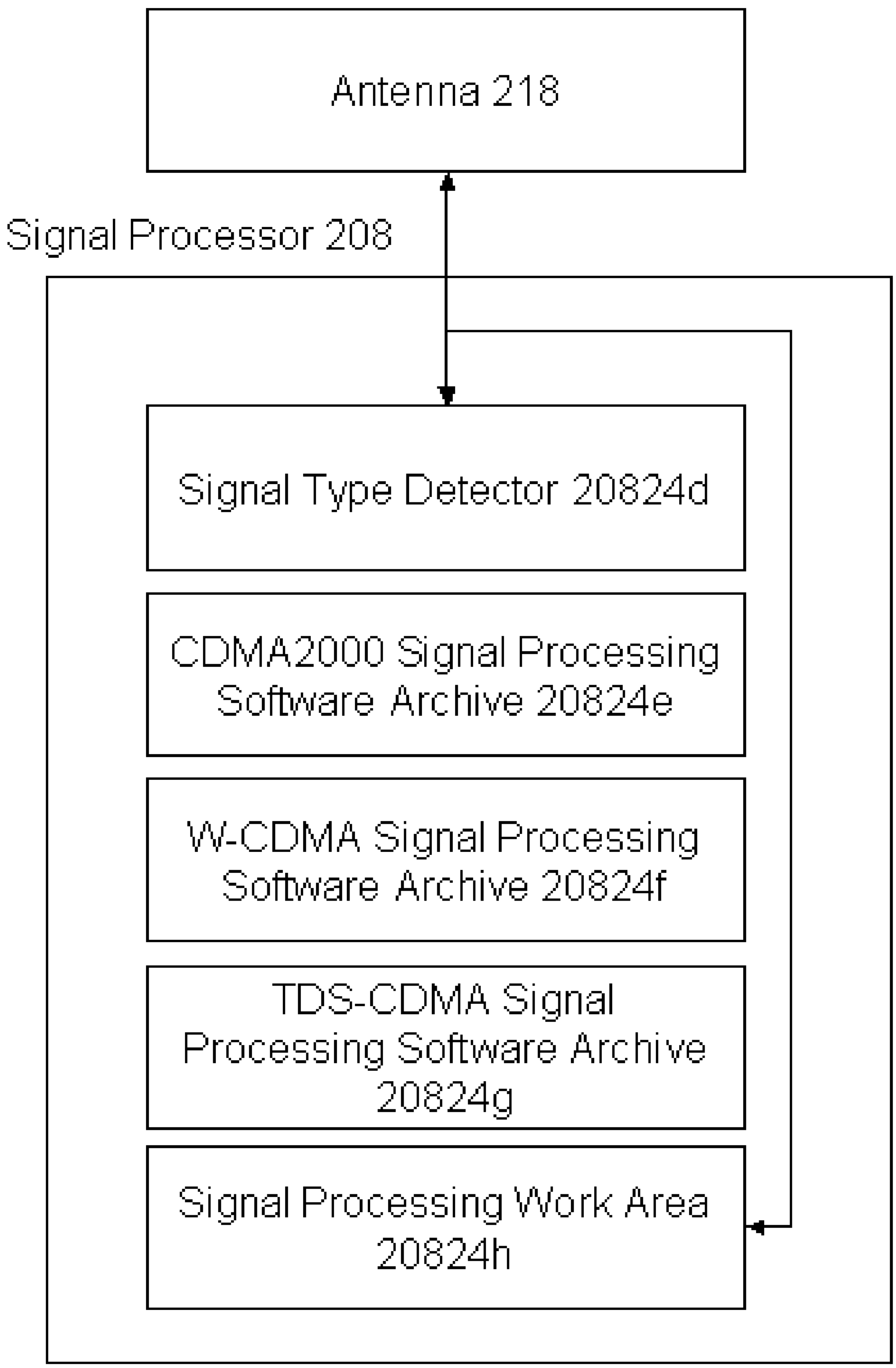

FIG. 502 is a block diagram illustrating an exemplary embodiment of the present invention.

Figure 502A:
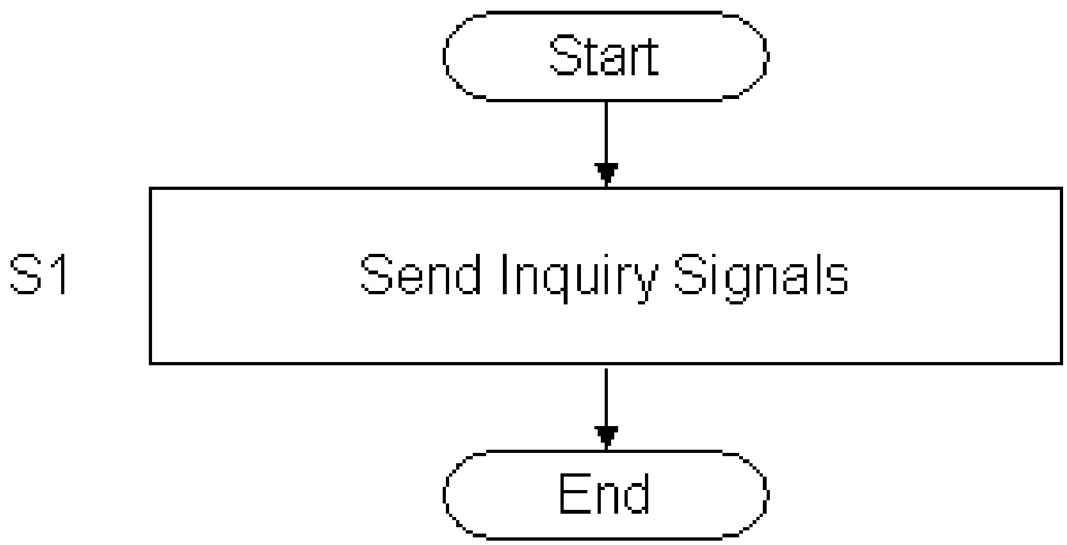

FIG. 502*a* is a flowchart illustrating an exemplary embodiment of the present invention.

Figure 503:
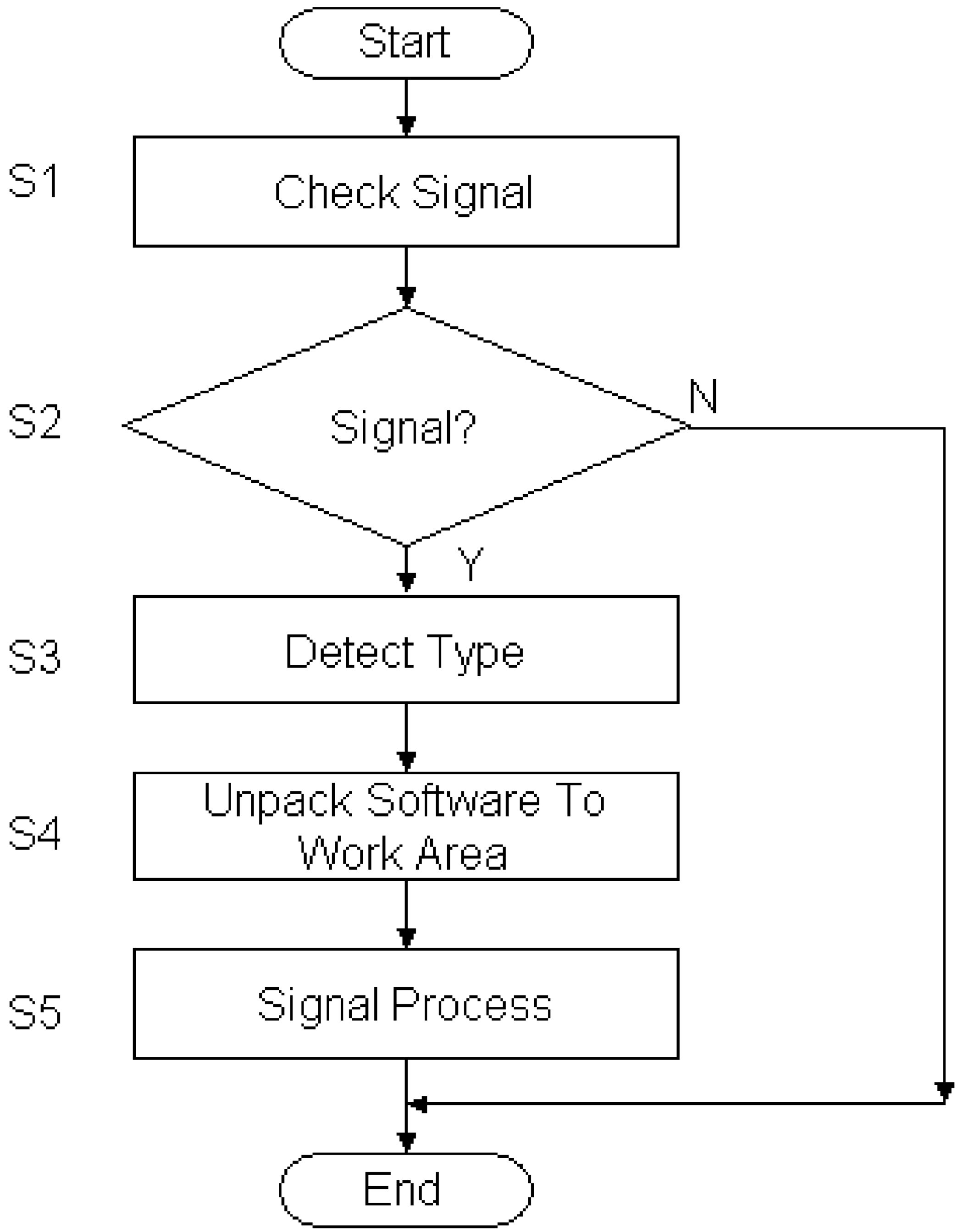

FIG. 503 is a flowchart illustrating an exemplary embodiment of the present invention.

Figure 504:
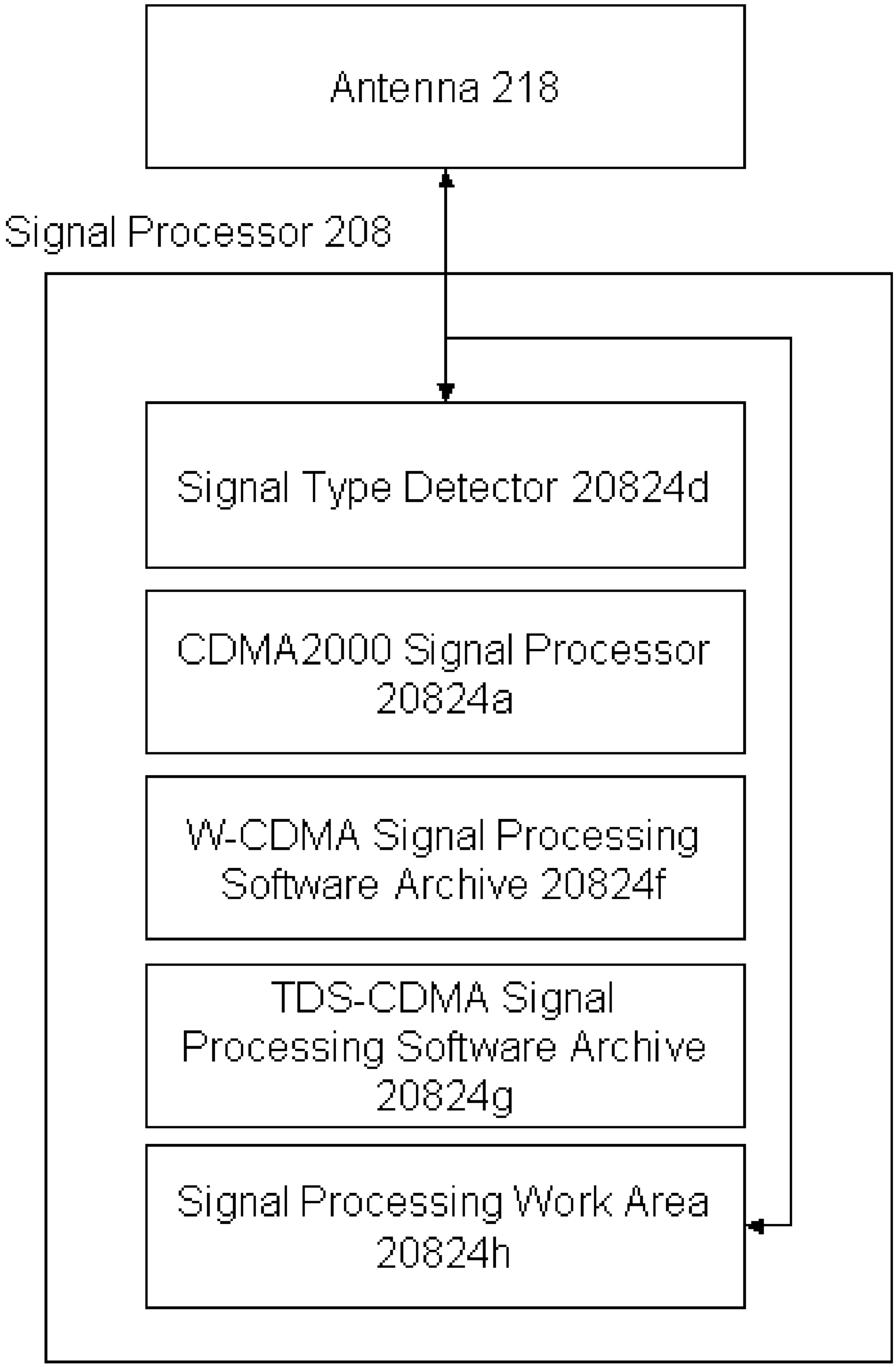

FIG. 504 is a block diagram illustrating an exemplary embodiment of the present invention.

Figure 504A:
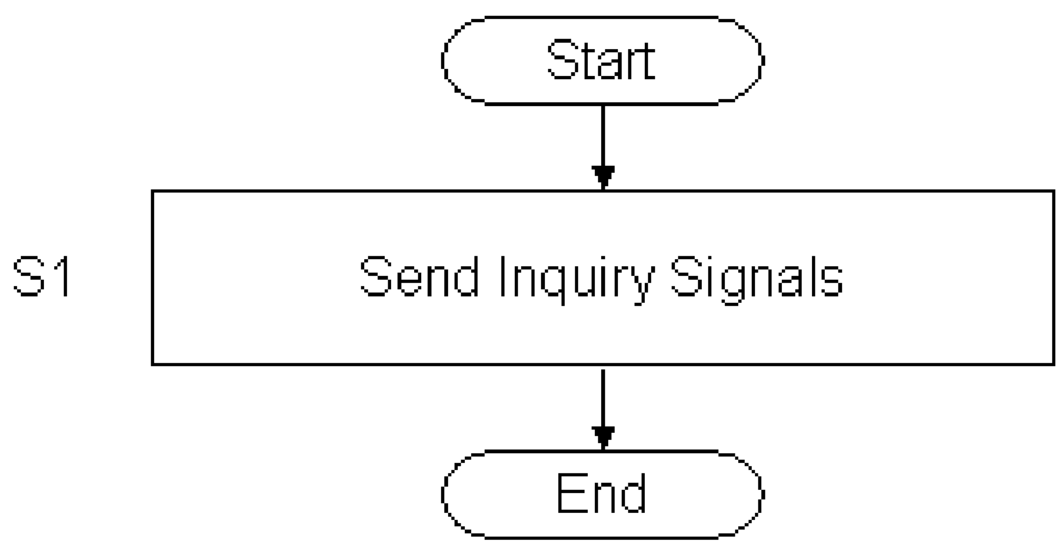

FIG. 504*a* is a flowchart illustrating an exemplary embodiment of the present invention.

Figure 505:
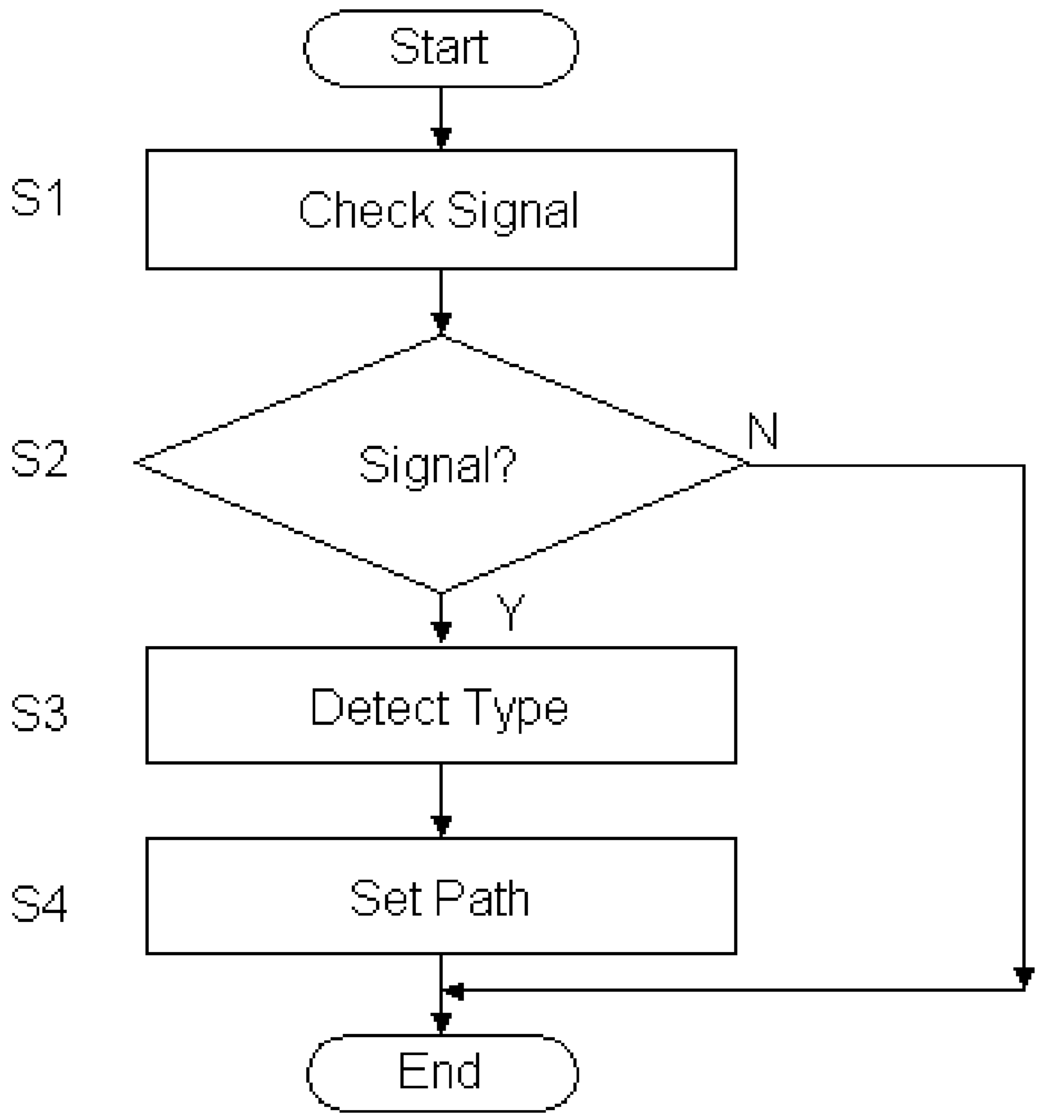

FIG. 505 is a flowchart illustrating an exemplary embodiment of the present invention.

Figure 506:
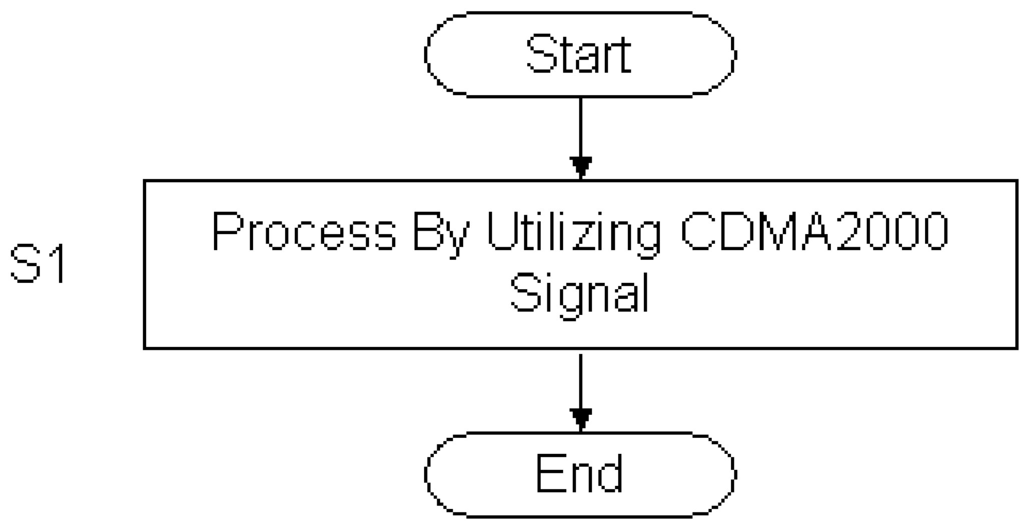

FIG. 506 is a flowchart illustrating an exemplary embodiment of the present invention.

Figure 507:
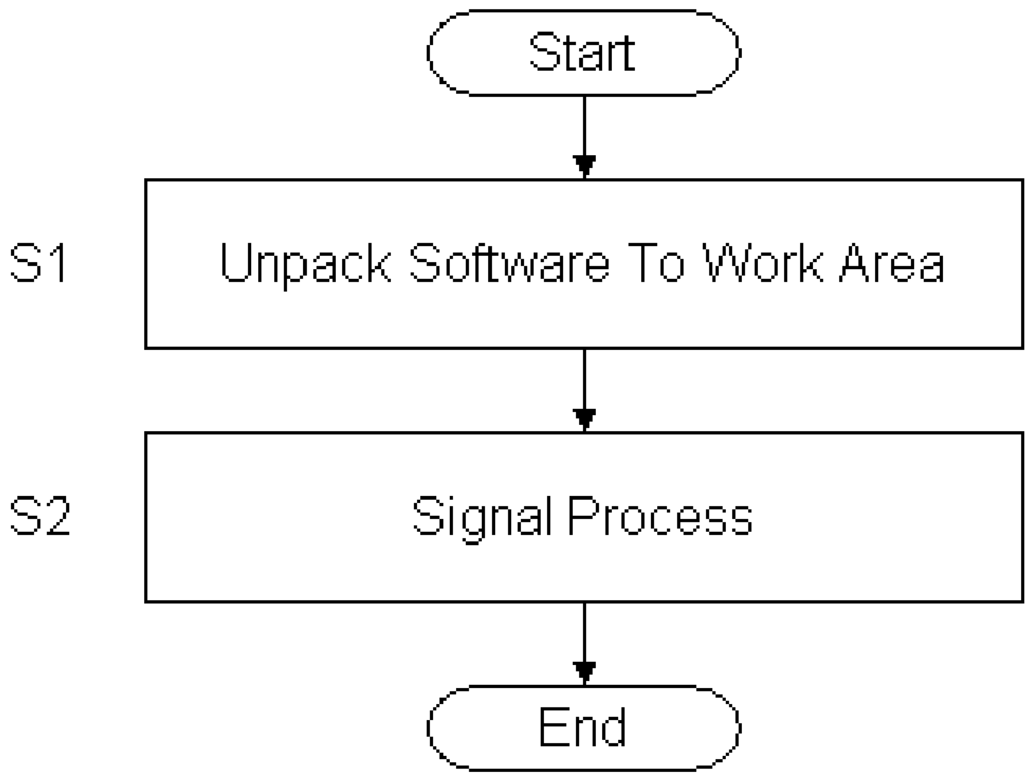

FIG. 507 is a flowchart illustrating an exemplary embodiment of the present invention.

Figure 508:
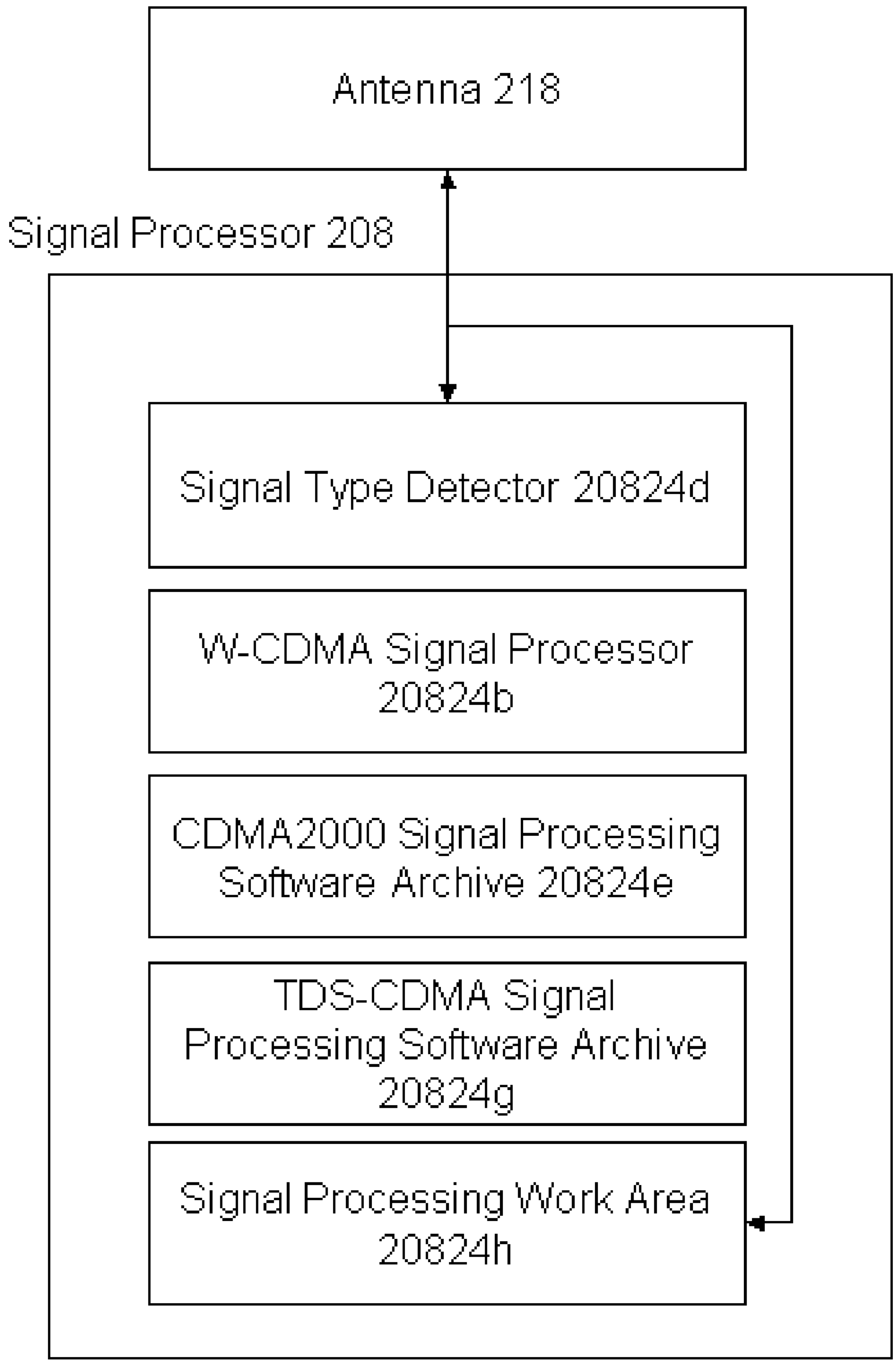

FIG. 508 is a block diagram illustrating an exemplary embodiment of the present invention.

Figure 508A:
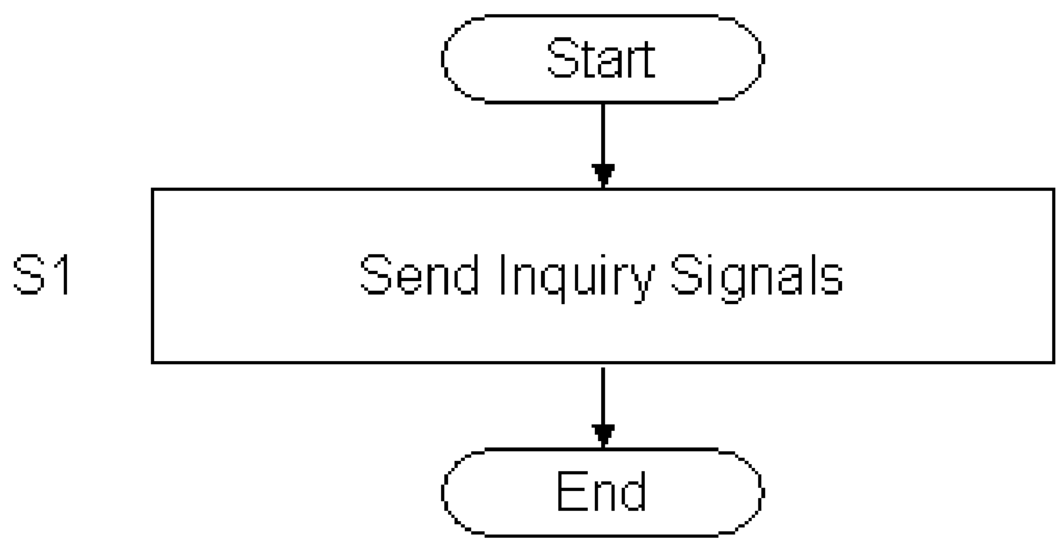

FIG. 508*a* is a flowchart illustrating an exemplary embodiment of the present invention.

Figure 509:
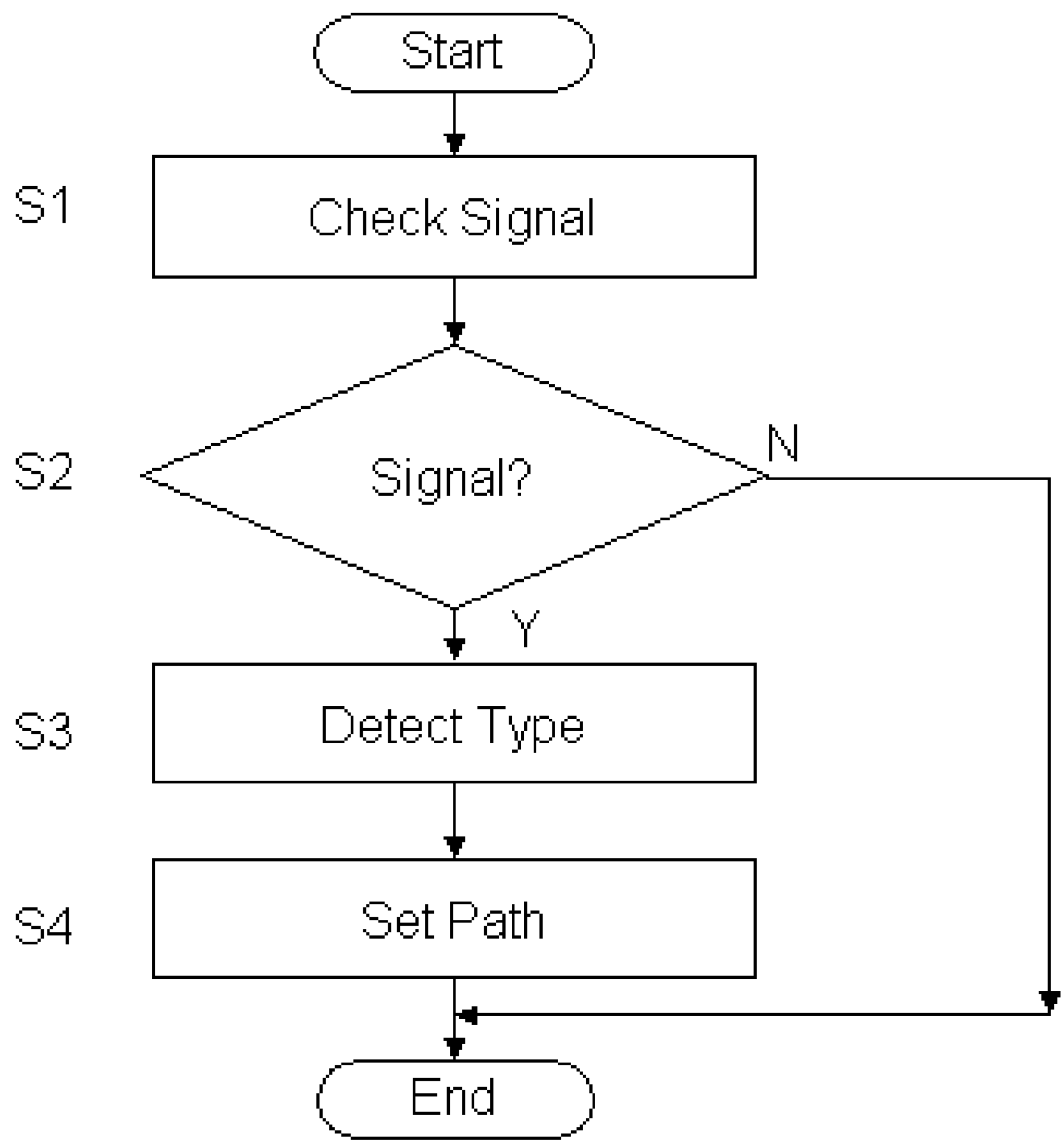

FIG. 509 is a flowchart illustrating an exemplary embodiment of the present invention.

Figure 510:
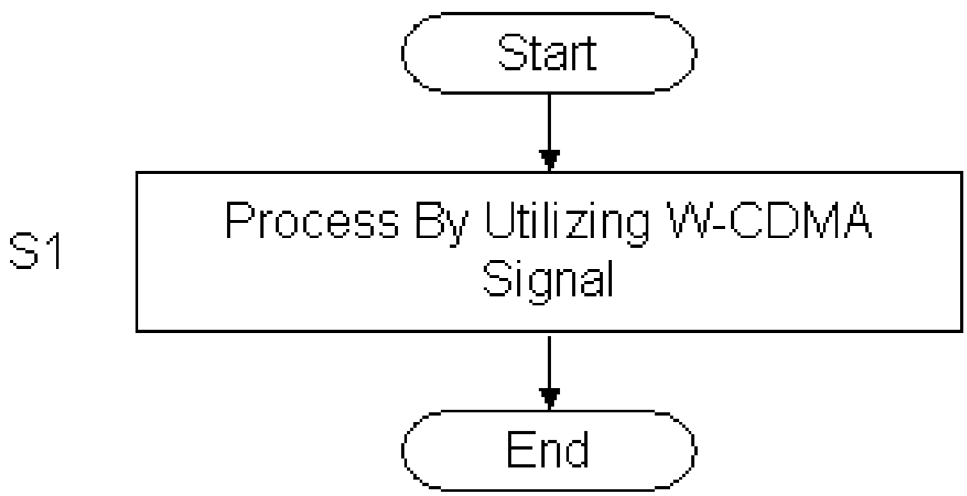

FIG. 510 is a flowchart illustrating an exemplary embodiment of the present invention.

Figure 511:
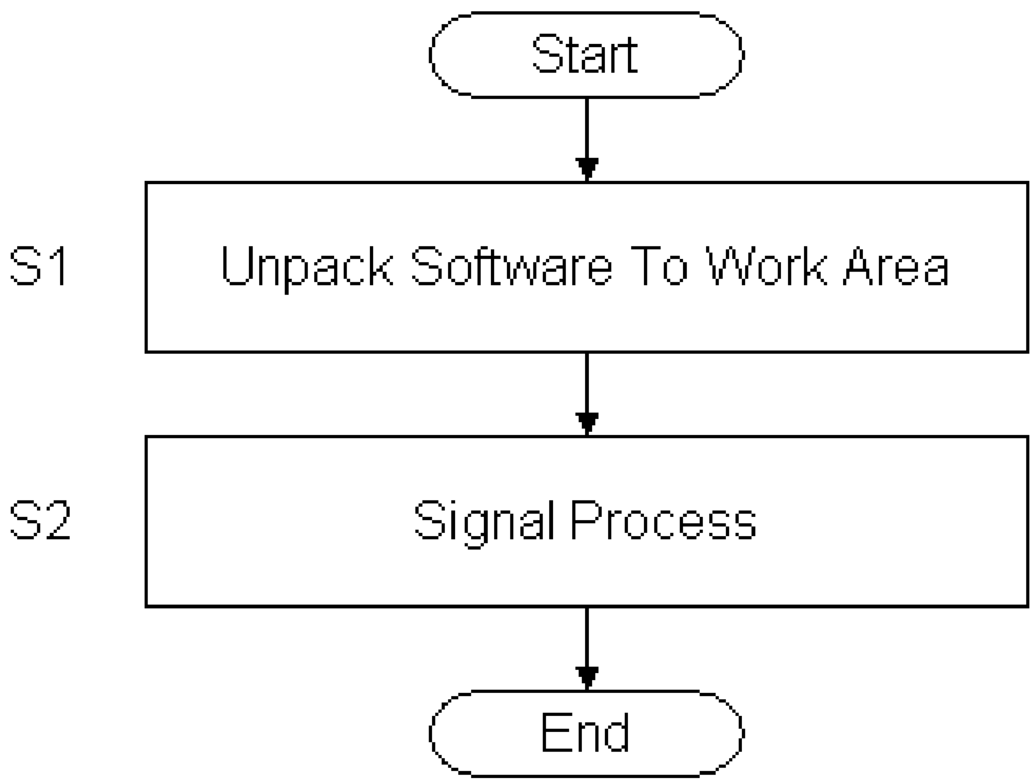

FIG. 511 is a flowchart illustrating an exemplary embodiment of the present invention.

Figure 512:
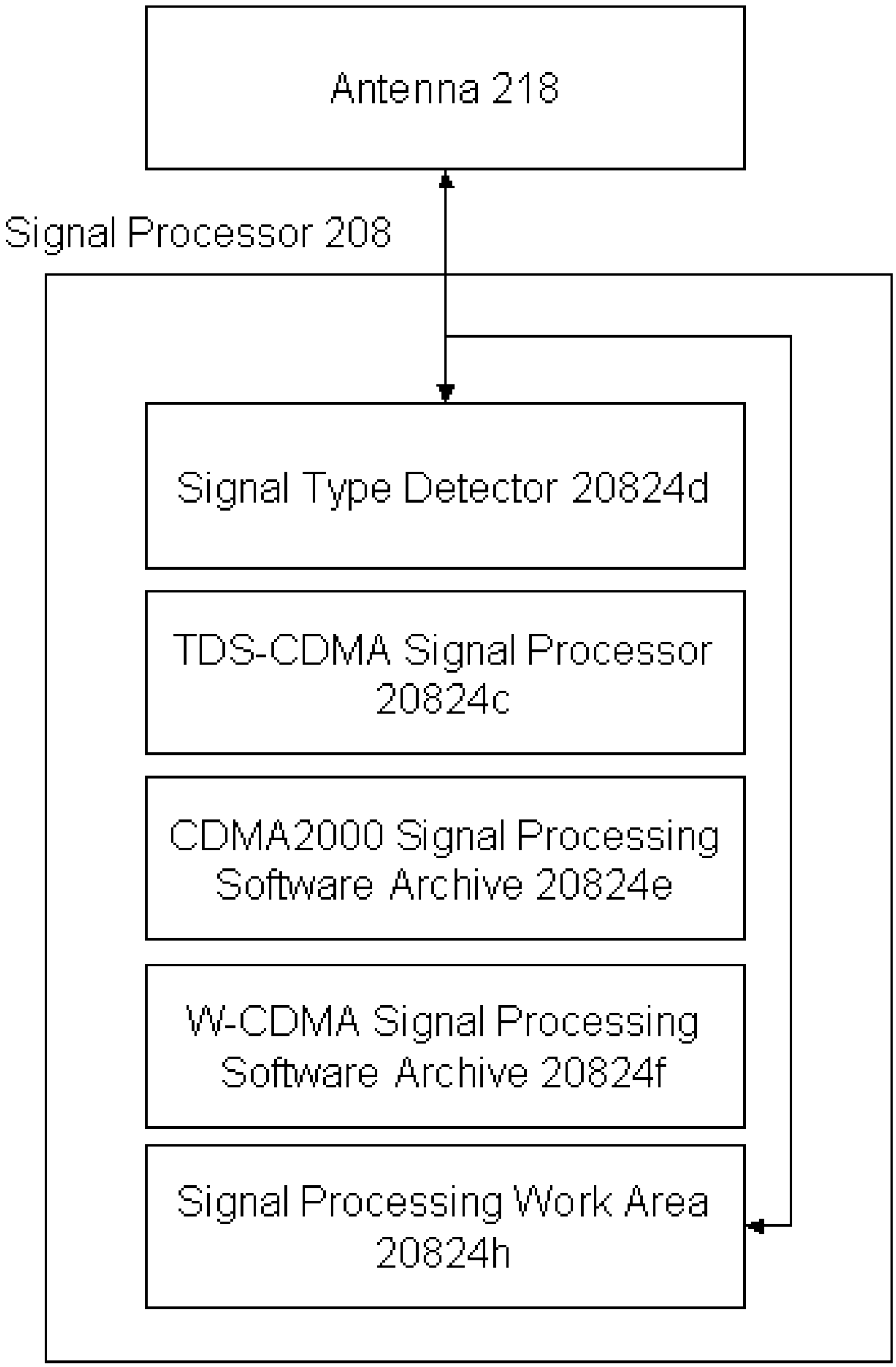

FIG. 512 is a block diagram illustrating an exemplary embodiment of the present invention.

Figure 512A:
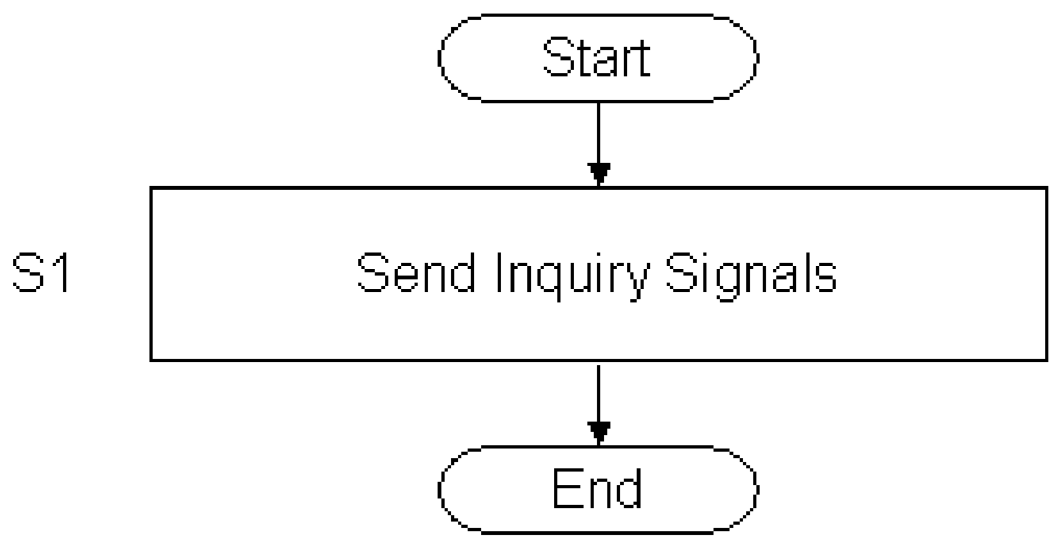

FIG. 512*a* is a flowchart illustrating an exemplary embodiment of the present invention.

Figure 513:
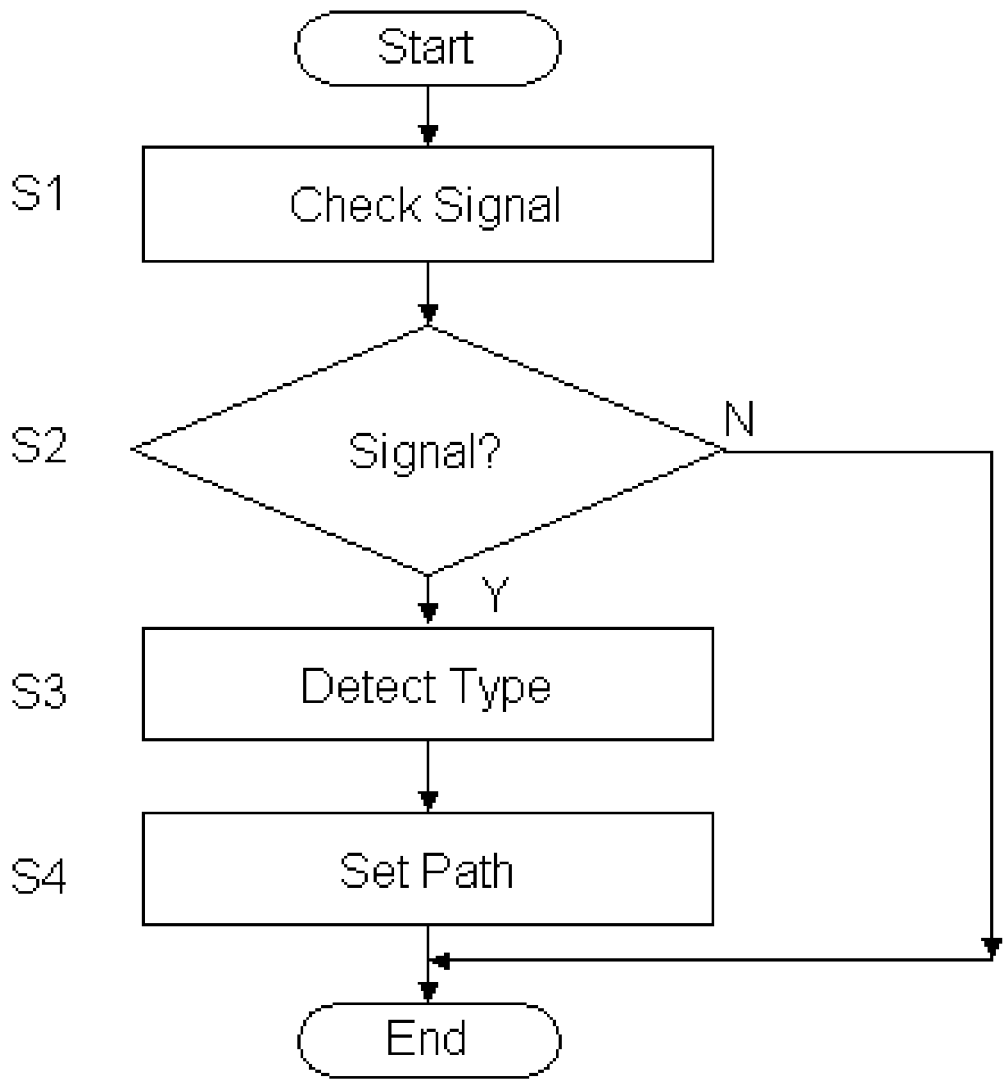

FIG. 513 is a flowchart illustrating an exemplary embodiment of the present invention.

Figure 514:
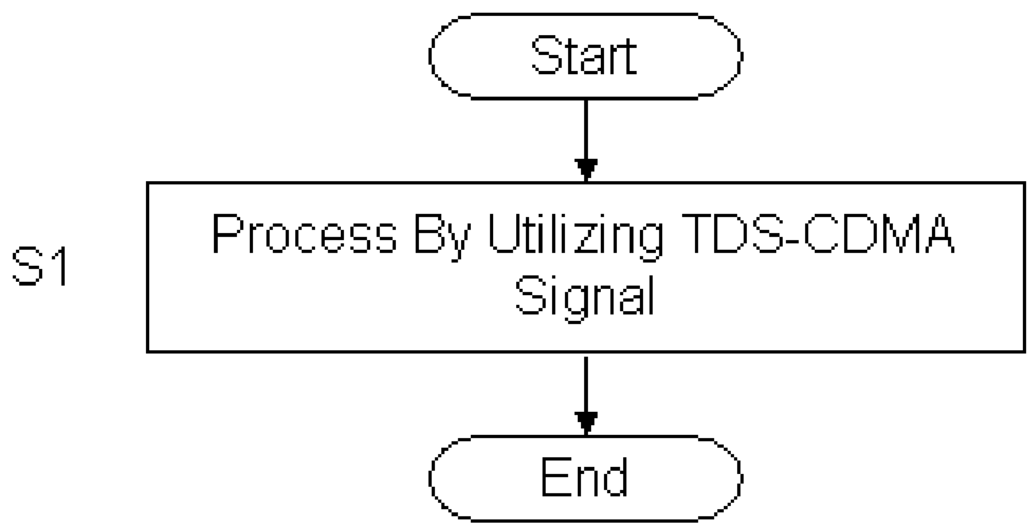

FIG. 514 is a flowchart illustrating an exemplary embodiment of the present invention.

Figure 515:
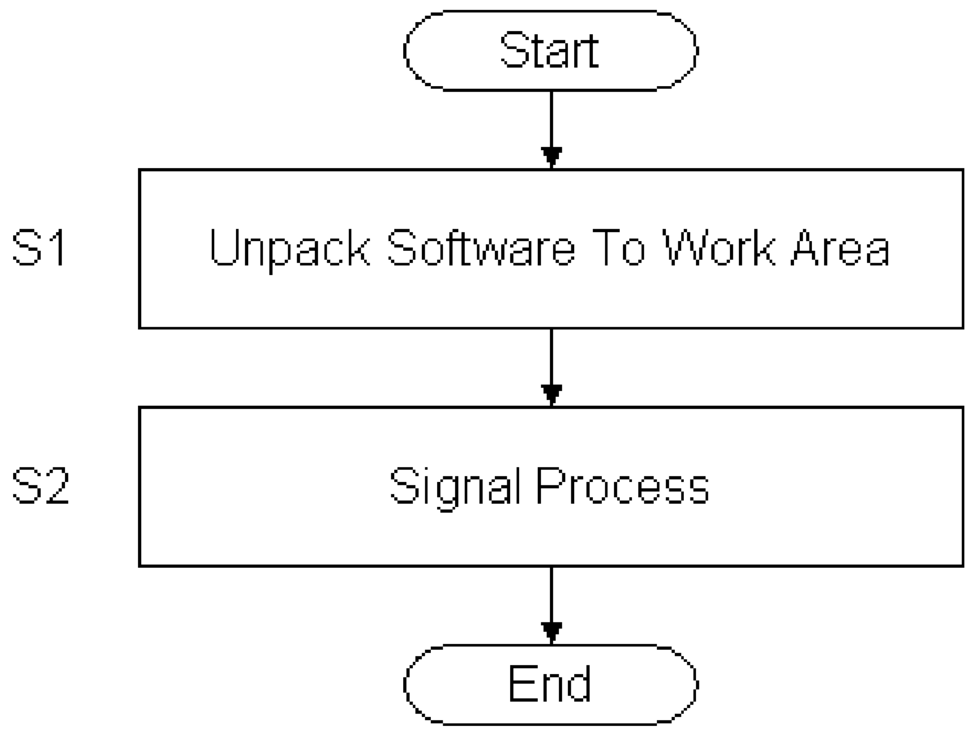

FIG. 515 is a flowchart illustrating an exemplary embodiment of the present invention.

Figure 516:
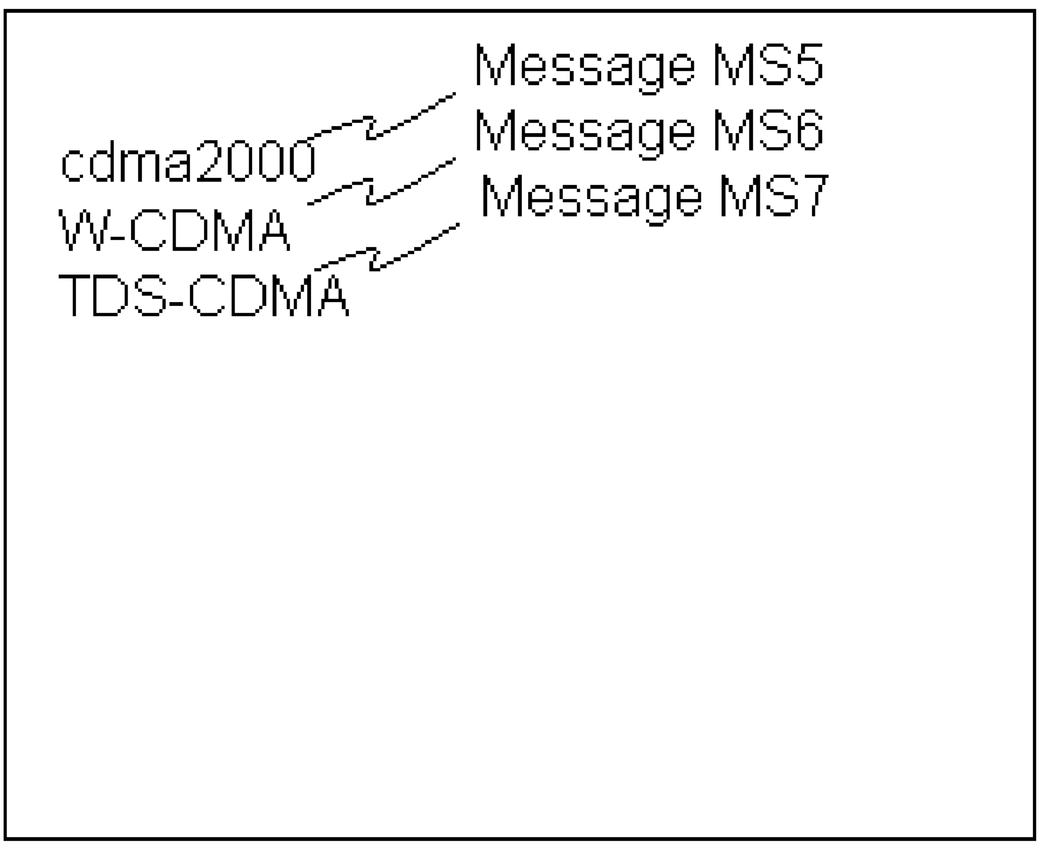

FIG. 516 is a simplified illustration illustrating an exemplary embodiment of the present invention.

Figure 517:
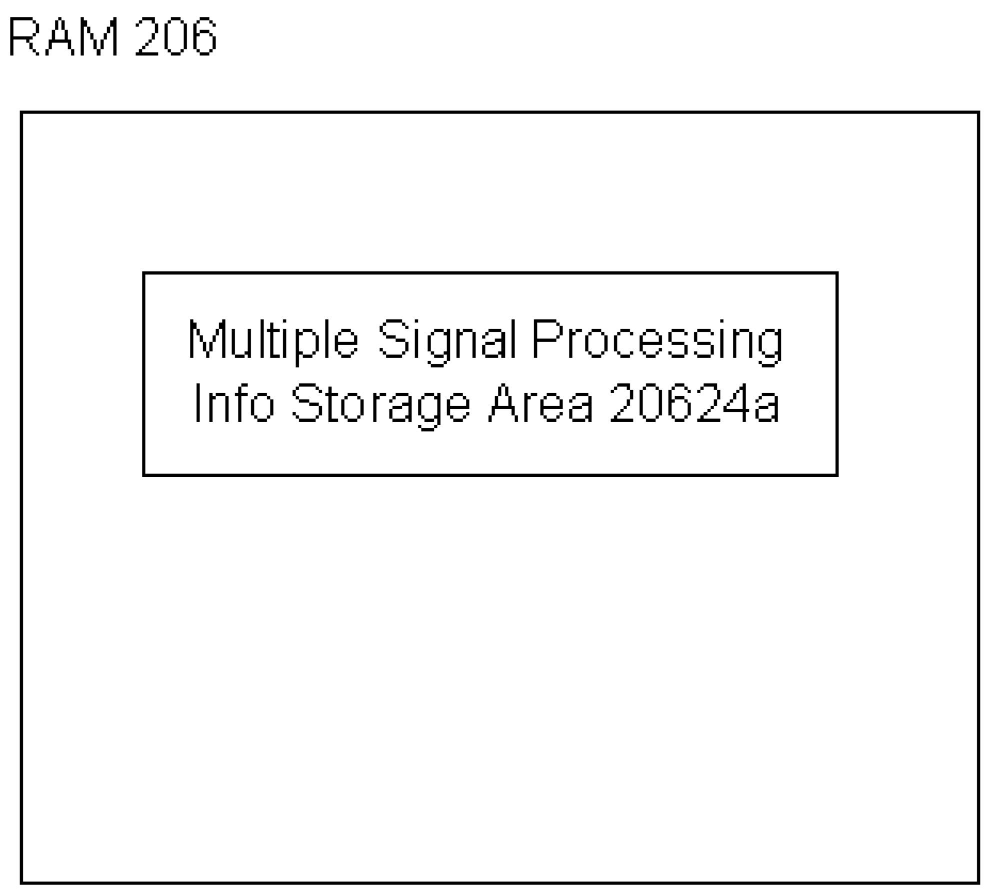

FIG. 517 is a block diagram illustrating an exemplary embodiment of the present invention.

Figure 518:
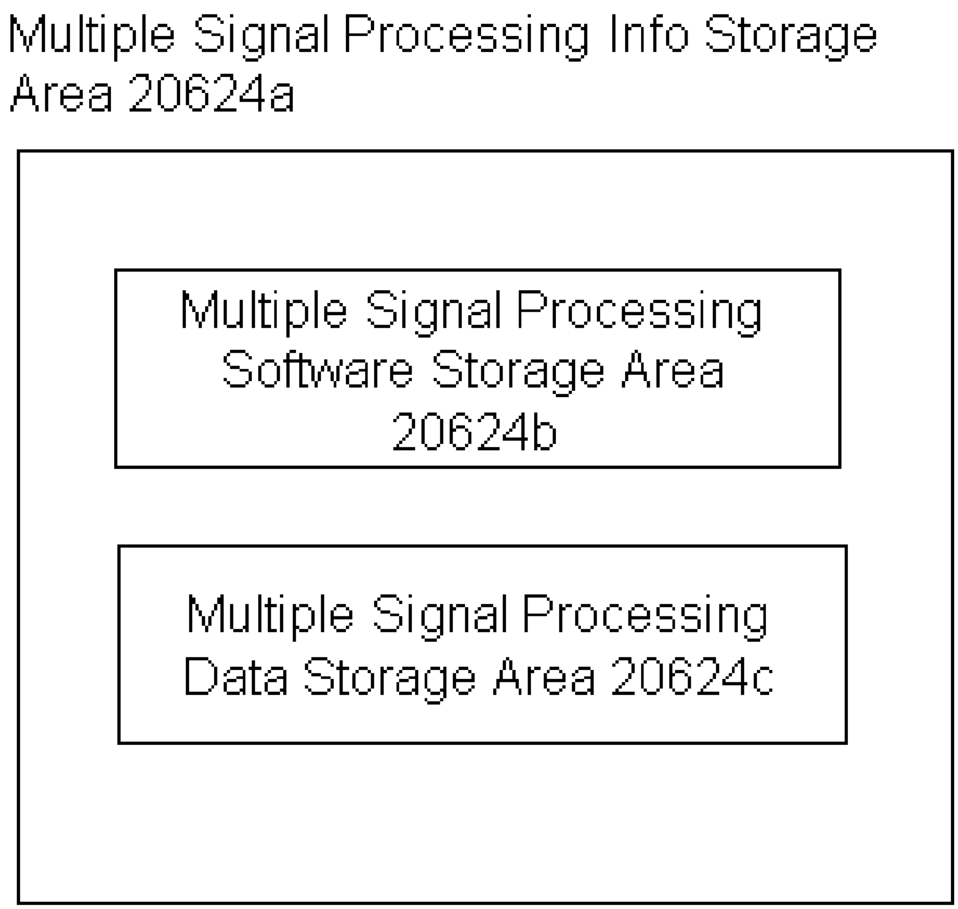

FIG. 518 is a block diagram illustrating an exemplary embodiment of the present invention.

Figure 519:
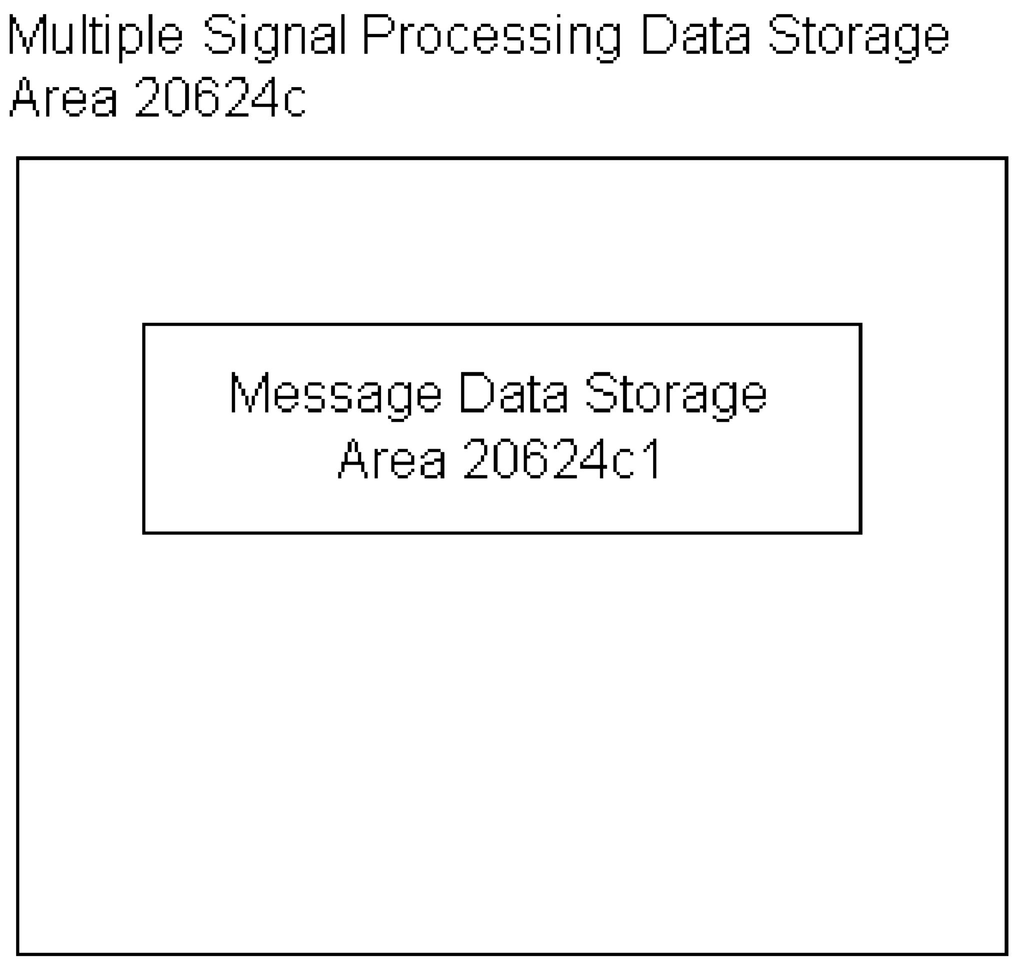

FIG. 519 is a block diagram illustrating an exemplary embodiment of the present invention.

Figure 520:
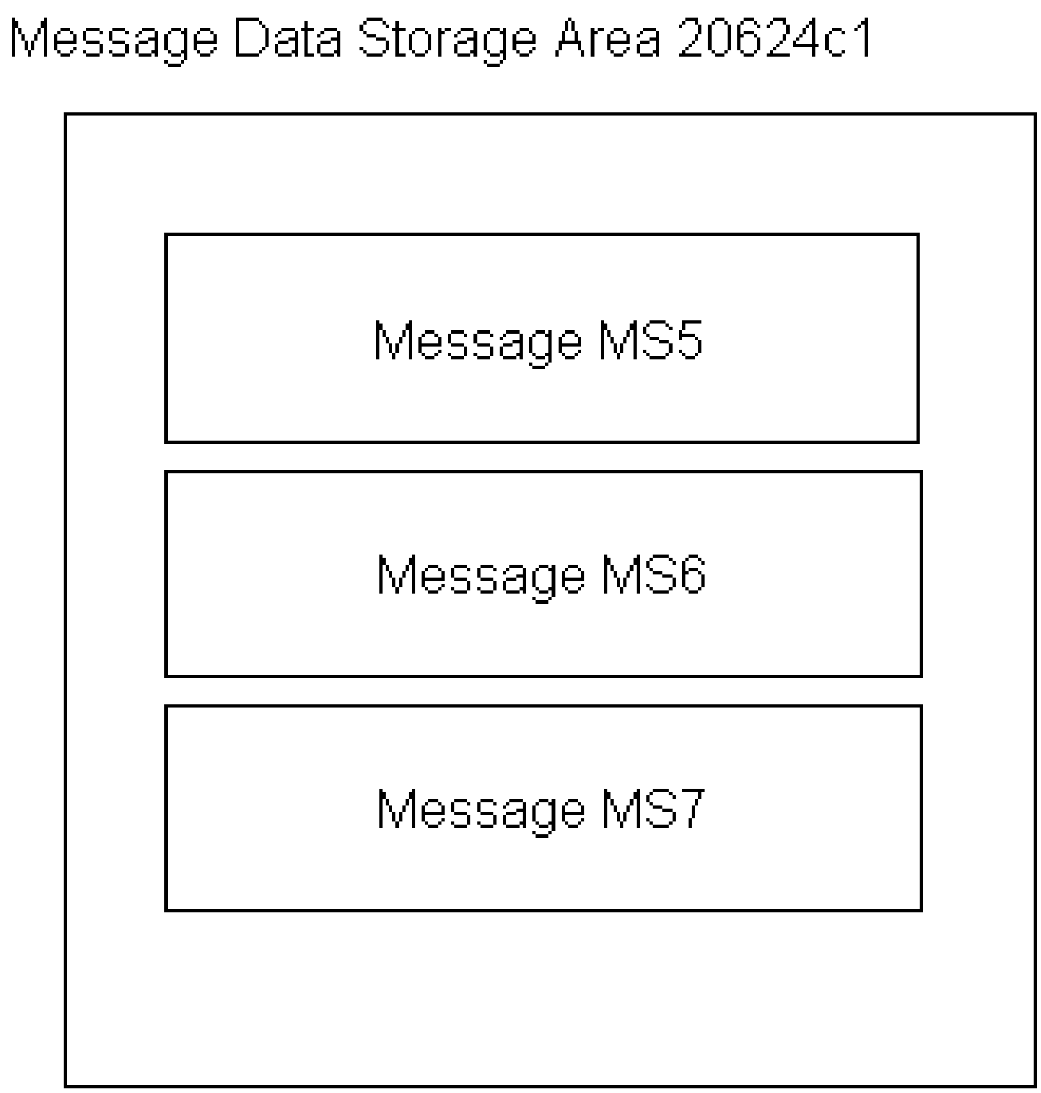

FIG. 520 is a block diagram illustrating an exemplary embodiment of the present invention.

Figure 521:
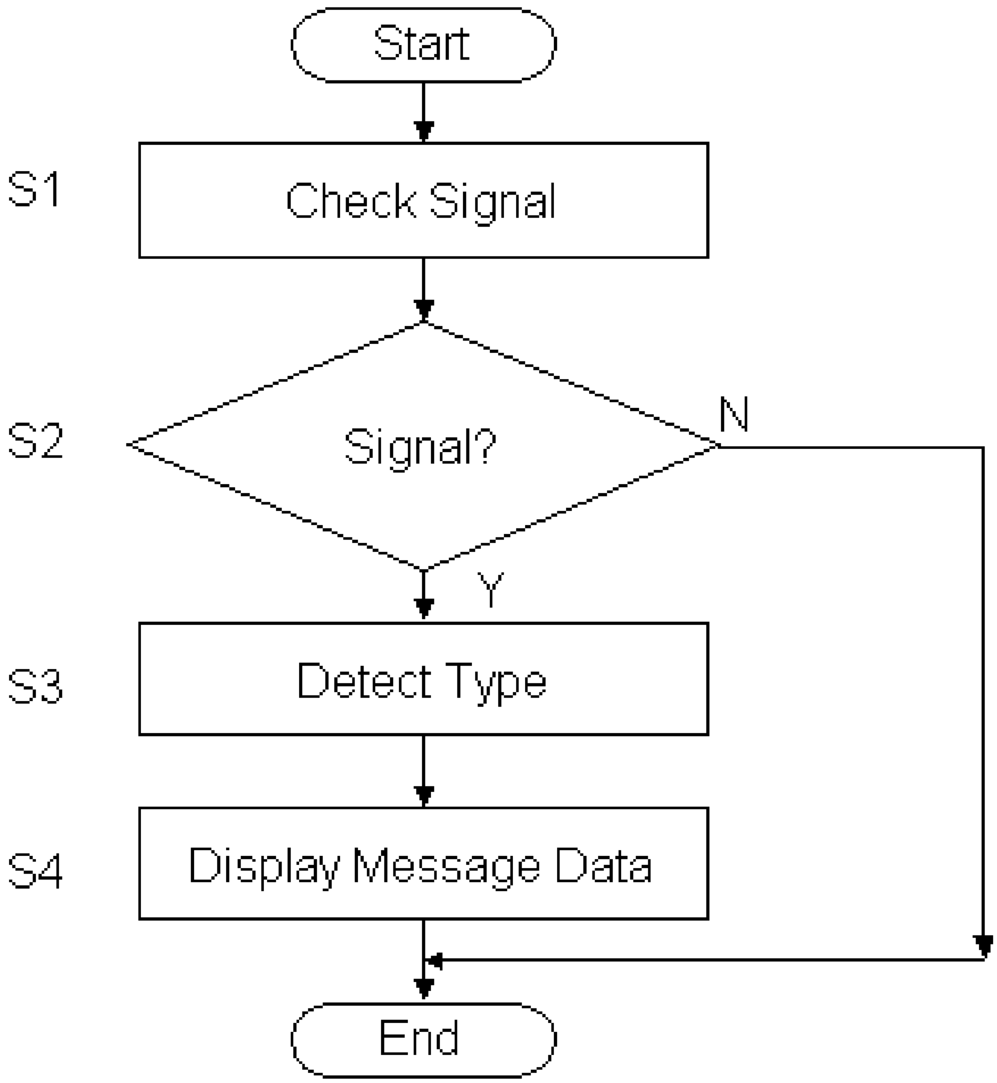

FIG. 521 is a flowchart illustrating an exemplary embodiment of the present invention.

Figure 522:
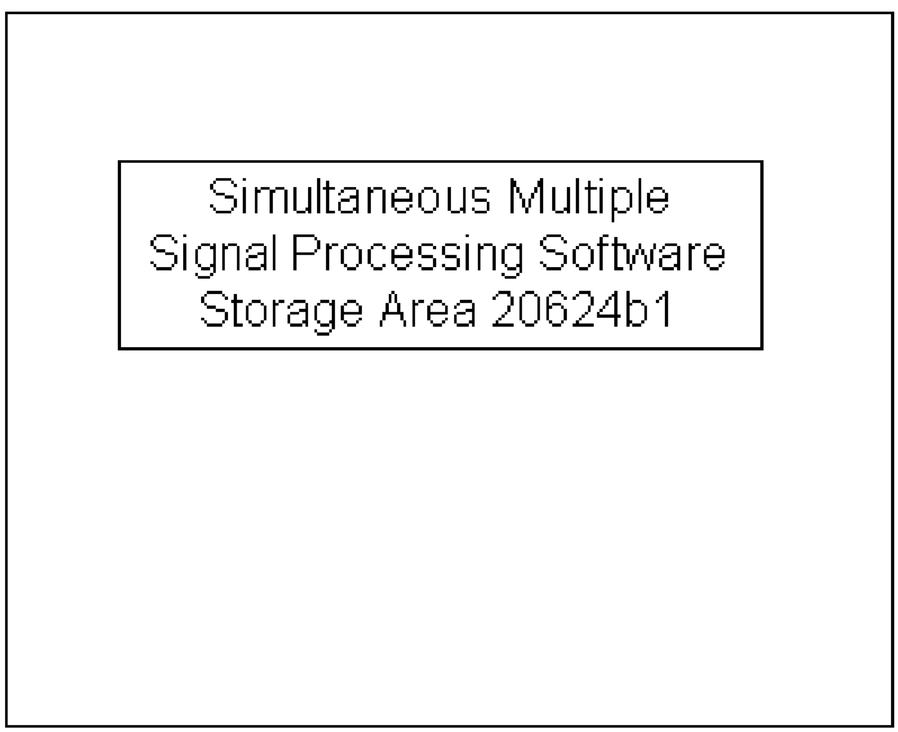

FIG. 522 is a block diagram illustrating an exemplary embodiment of the present invention.

Figure 523:
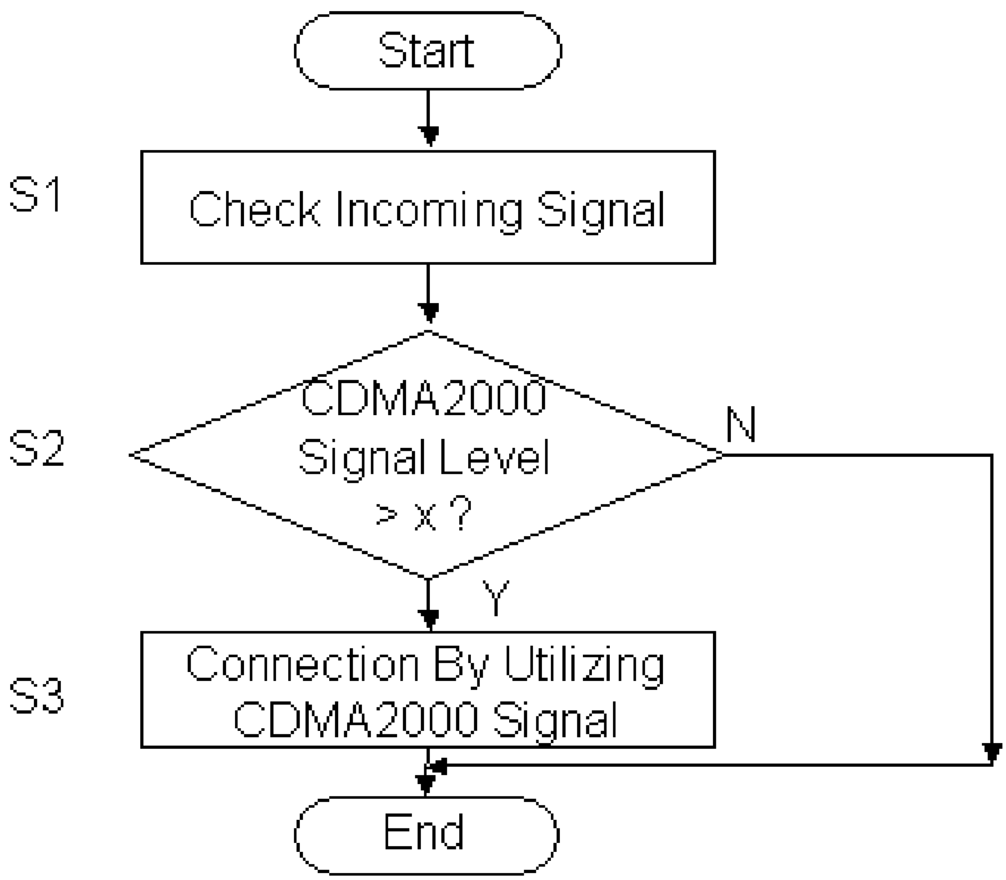

FIG. 523 is a flowchart illustrating an exemplary embodiment of the present invention.

Figure 524:
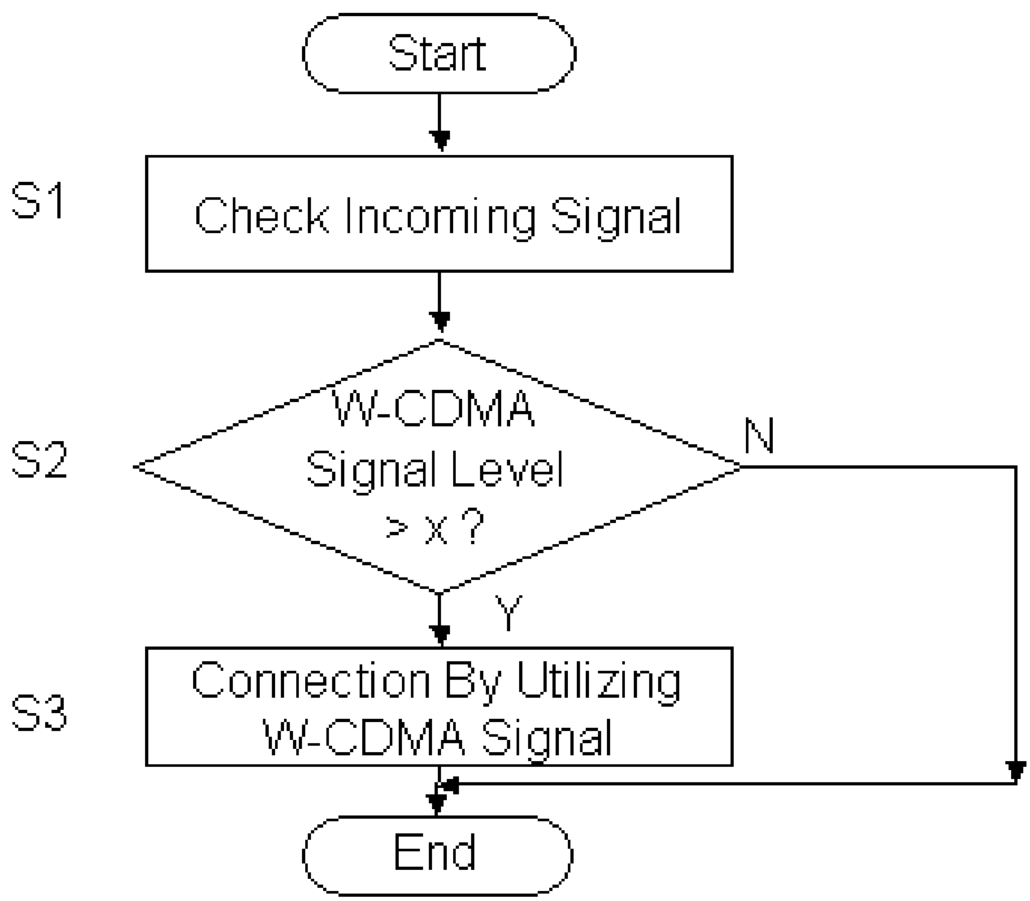

FIG. 524 is a flowchart illustrating an exemplary embodiment of the present invention.

Figure 525:
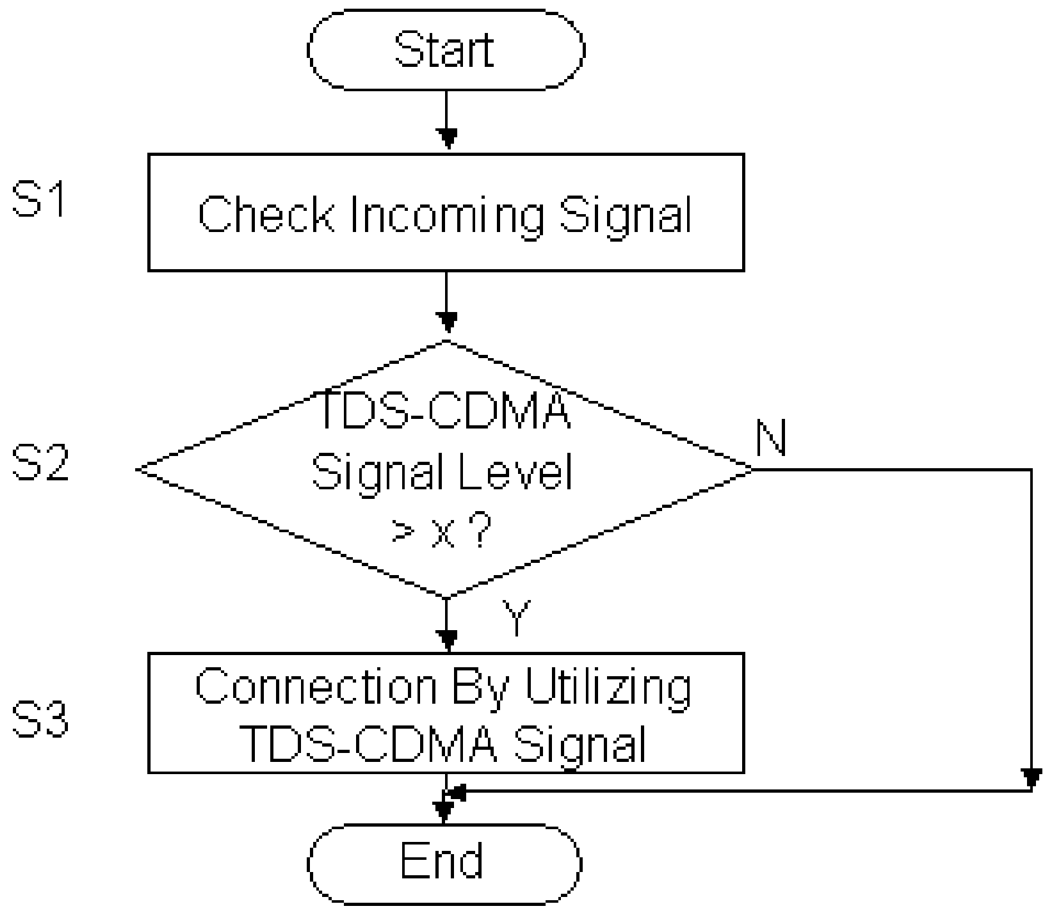

FIG. 525 is a flowchart illustrating an exemplary embodiment of the present invention.

Figure 526:
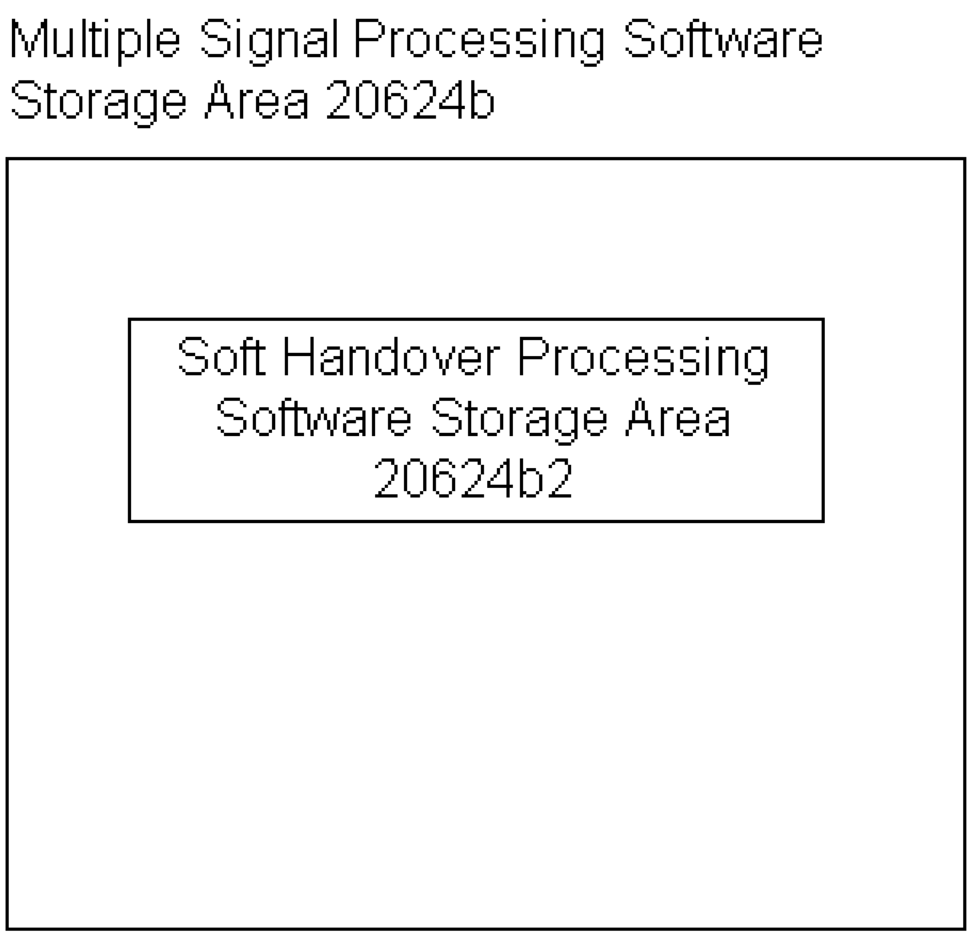

FIG. 526 is a block diagram illustrating an exemplary embodiment of the present invention.

Figure 527:
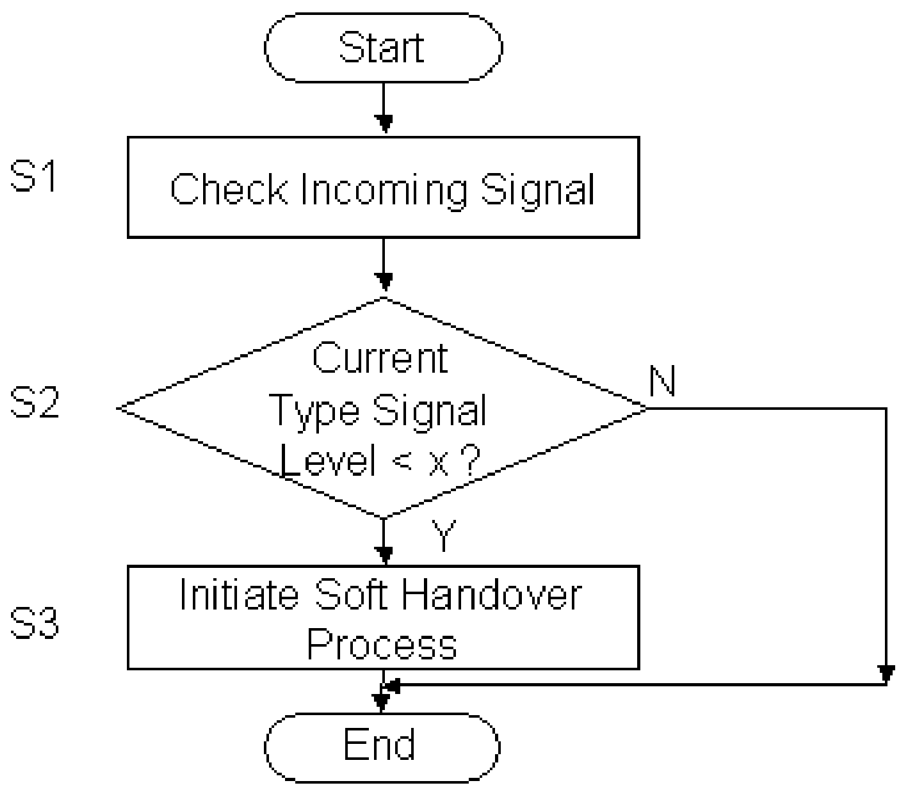

FIG. 527 is a flowchart illustrating an exemplary embodiment of the present invention.

Figure 528:
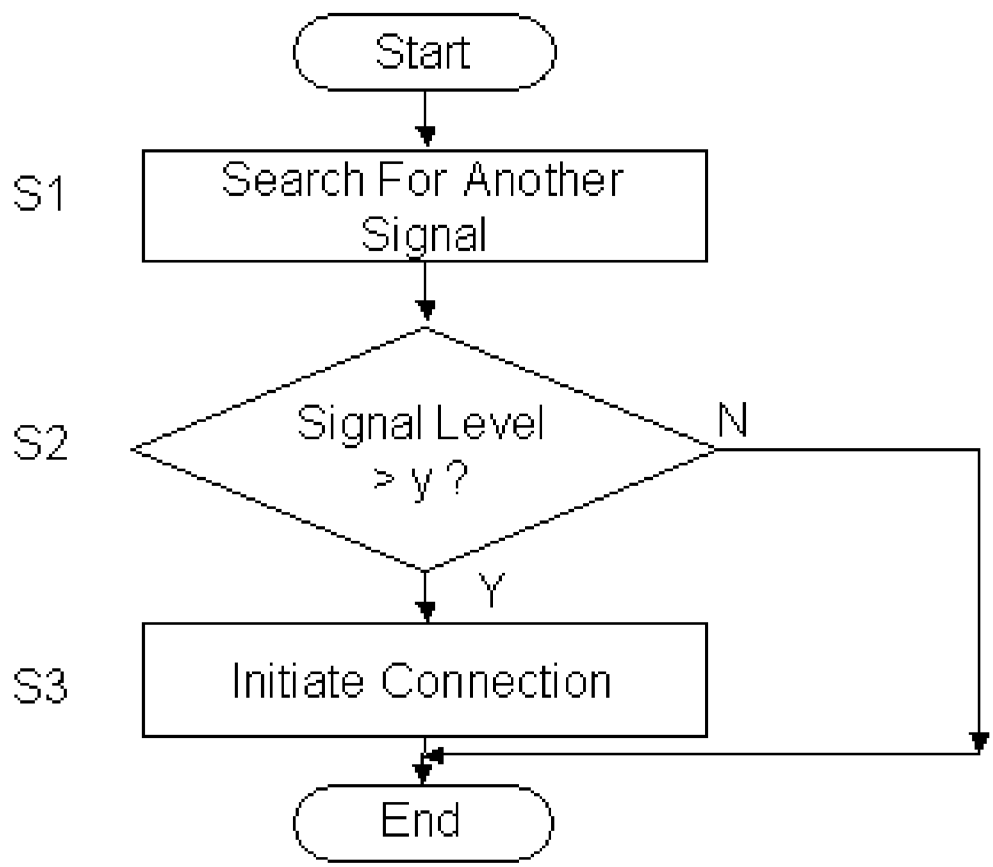

FIG. 528 is a flowchart illustrating an exemplary embodiment of the present invention.

Figure 529:
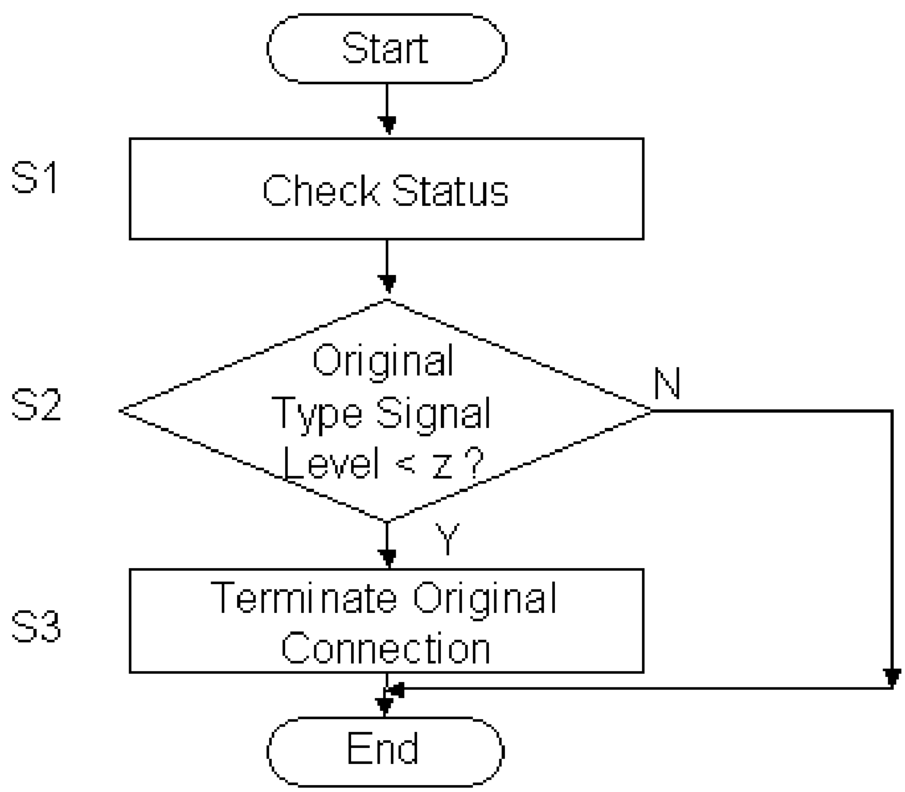

FIG. 529 is a flowchart illustrating an exemplary embodiment of the present invention.

Figure 530:
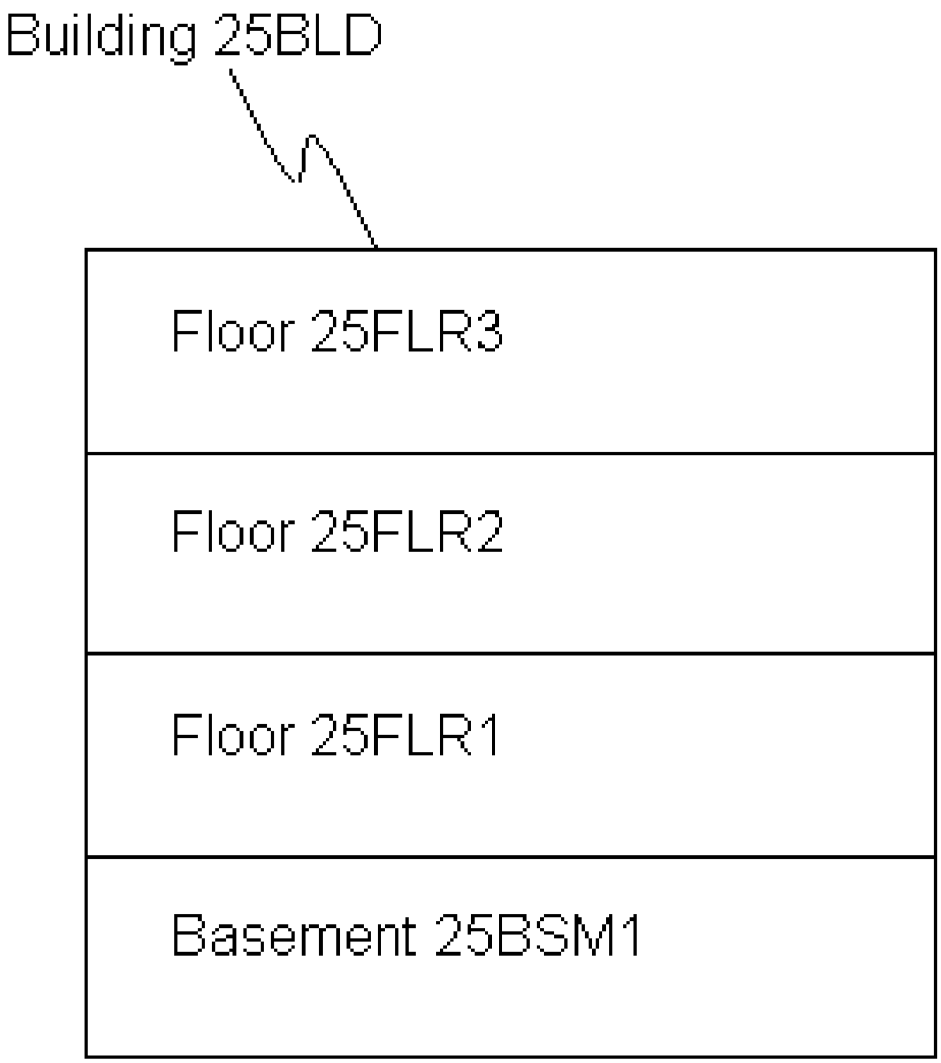

FIG. 530 is a simplified illustration illustrating an exemplary embodiment of the present invention.

Figure 531:
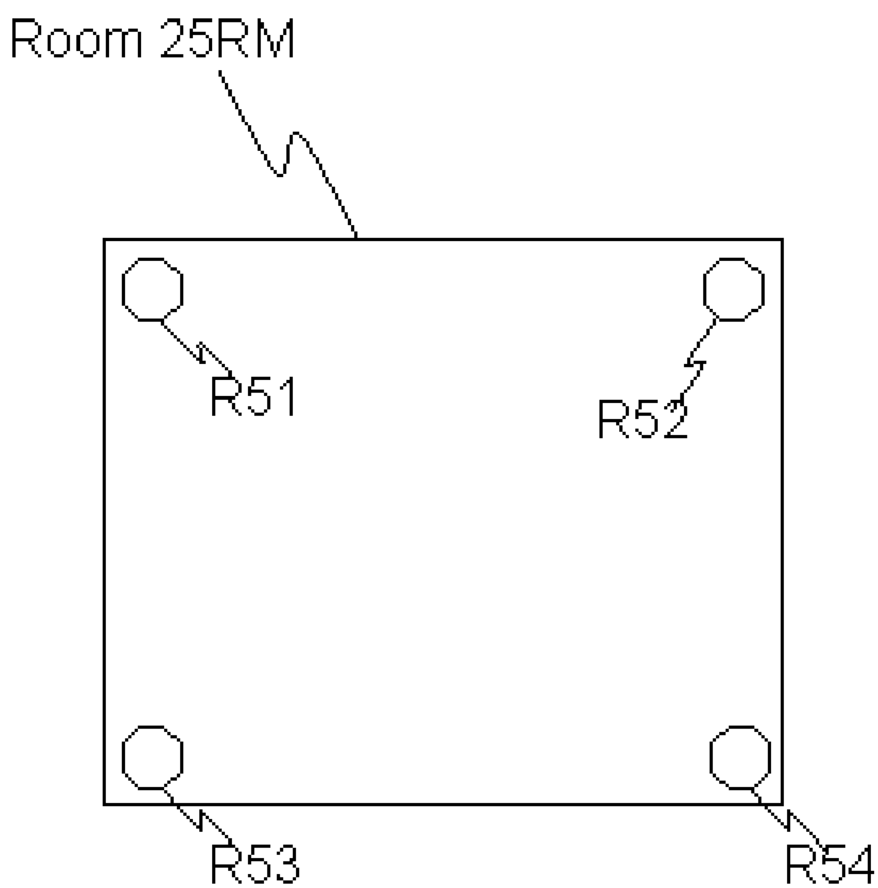

FIG. 531 is a simplified illustration illustrating an exemplary embodiment of the present invention.

Figure 532:
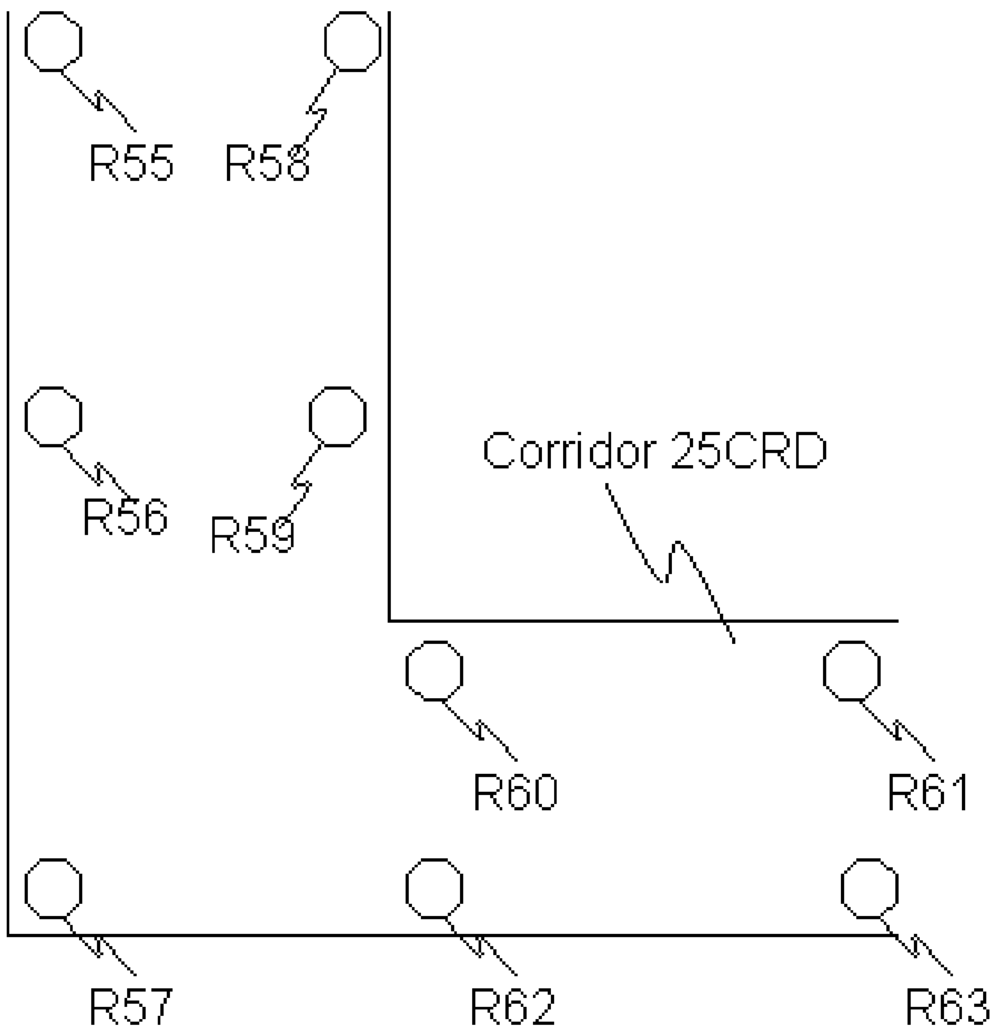

FIG. 532 is a simplified illustration illustrating an exemplary embodiment of the present invention.

Figure 533:
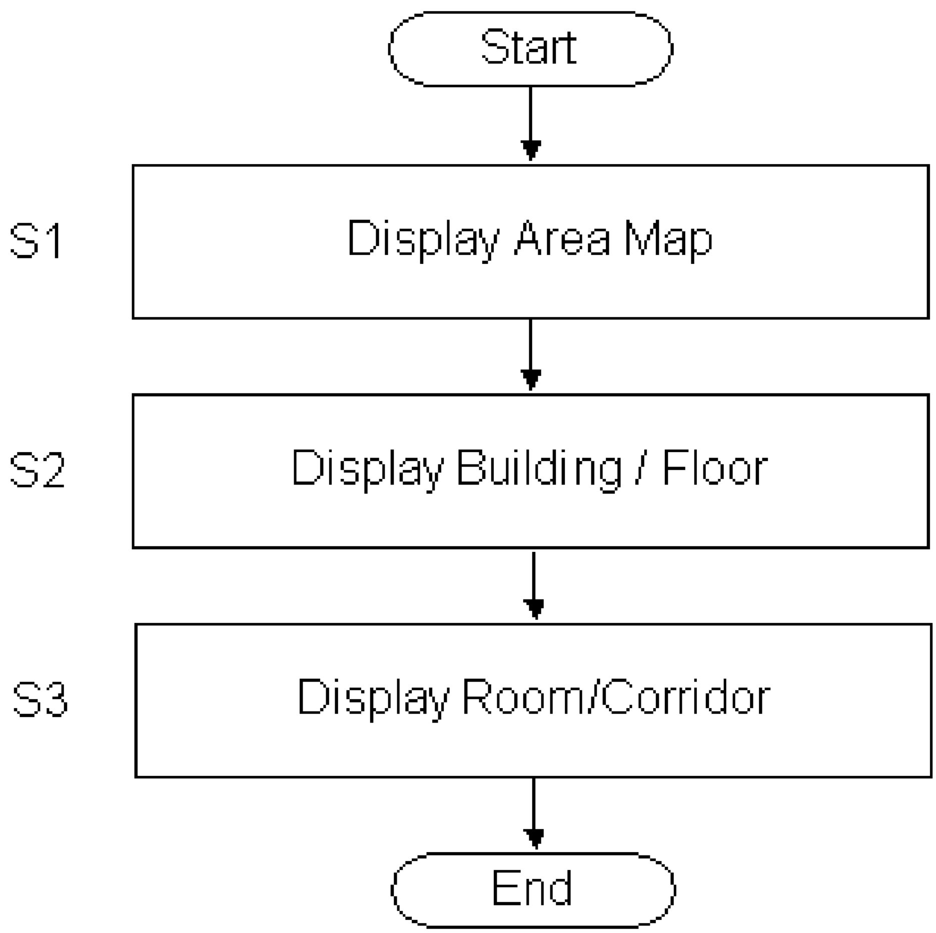

FIG. 533 is a simplified illustration illustrating an exemplary embodiment of the present invention.

Figure 534:
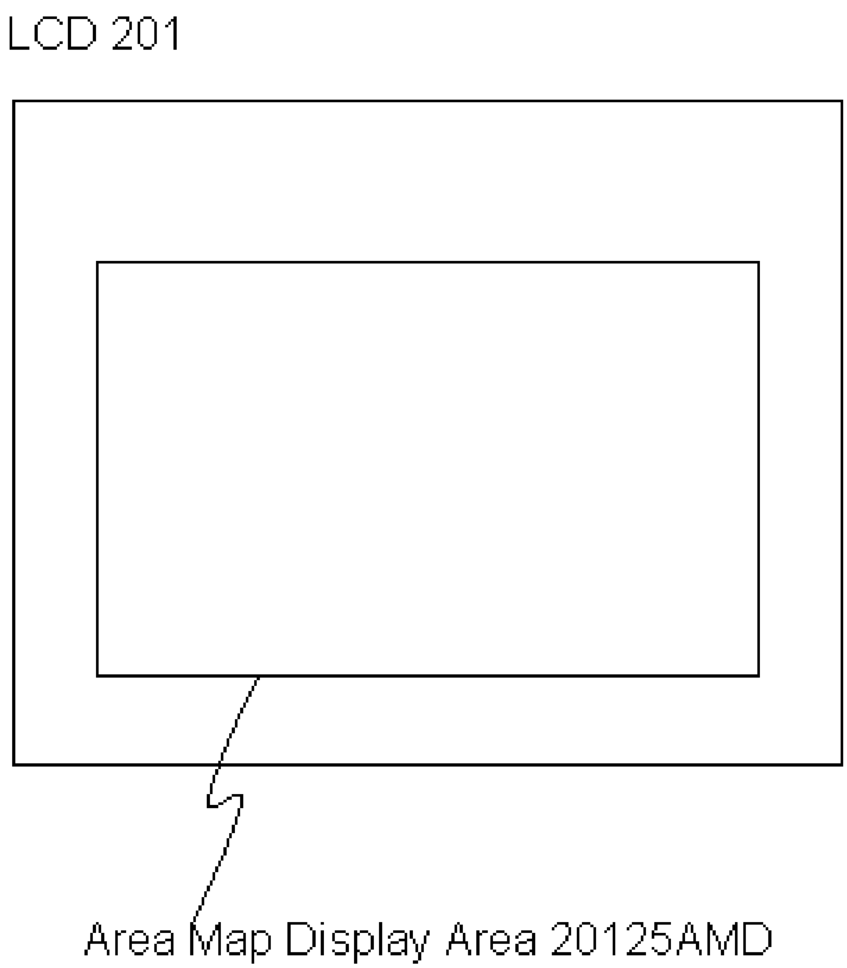

FIG. 534 is a simplified illustration illustrating an exemplary embodiment of the present invention.

Figure 535:
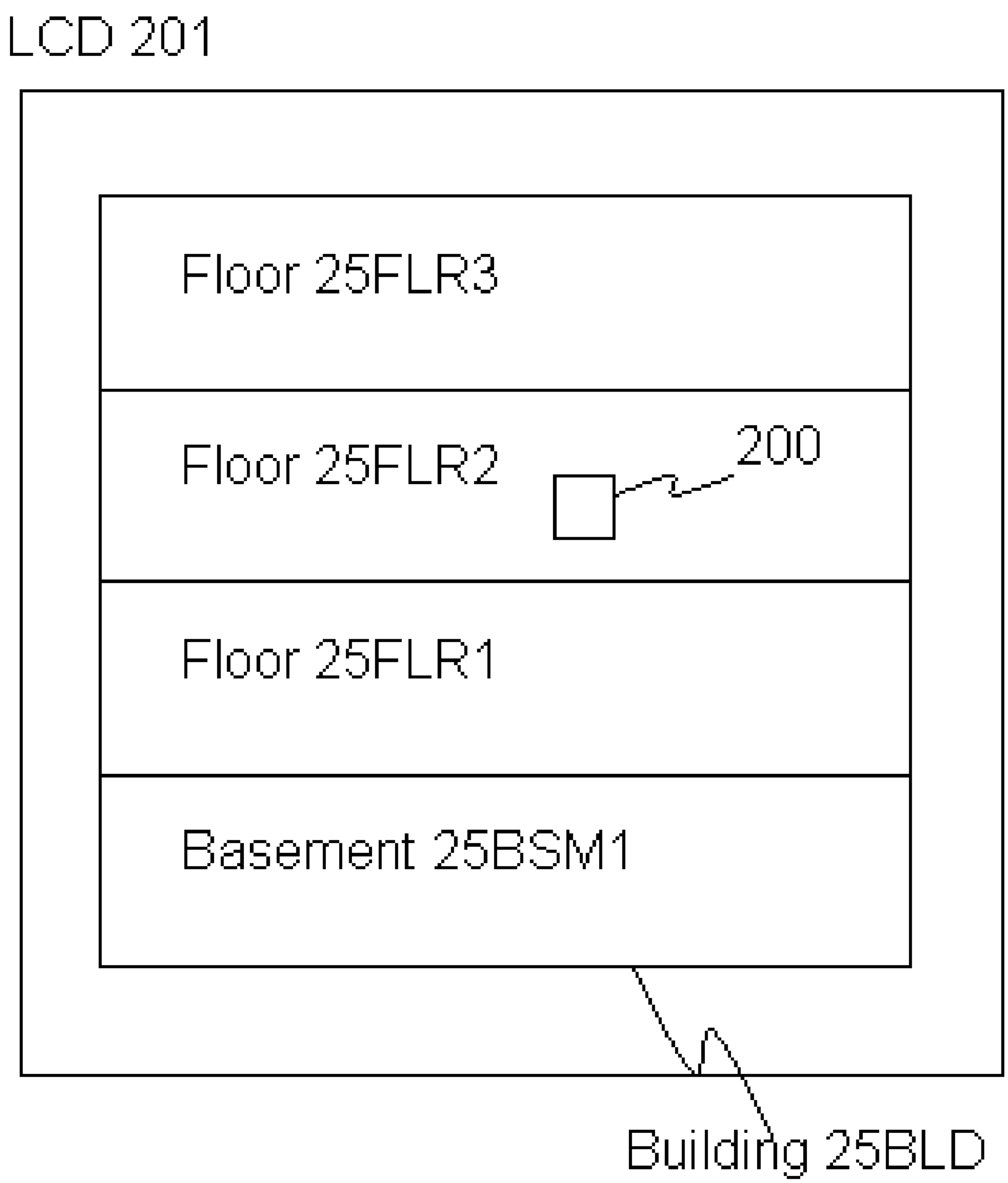

FIG. 535 is a simplified illustration illustrating an exemplary embodiment of the present invention.

Figure 536:
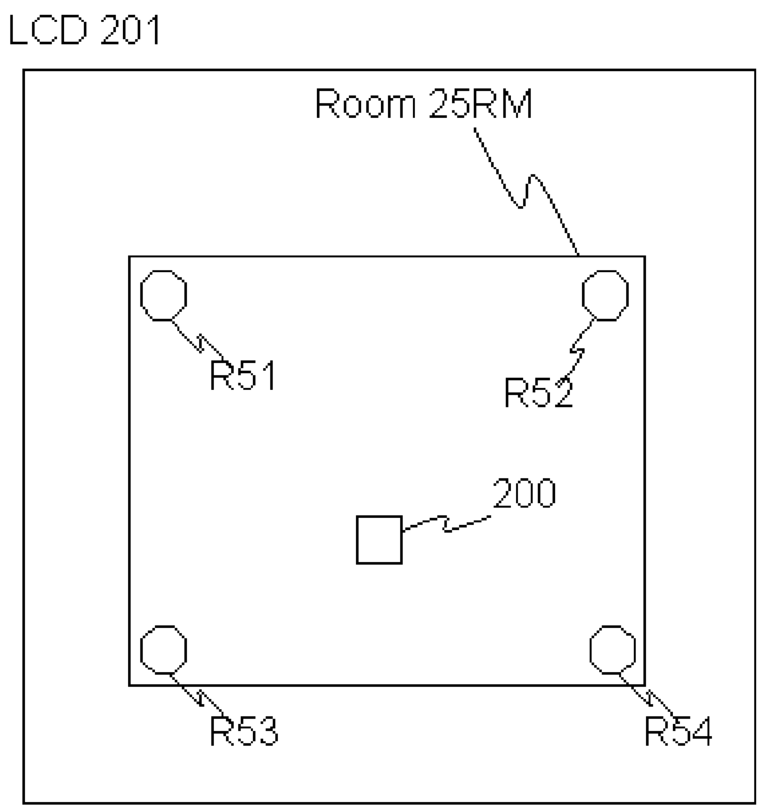

FIG. 536 is a simplified illustration illustrating an exemplary embodiment of the present invention.

Figure 537:
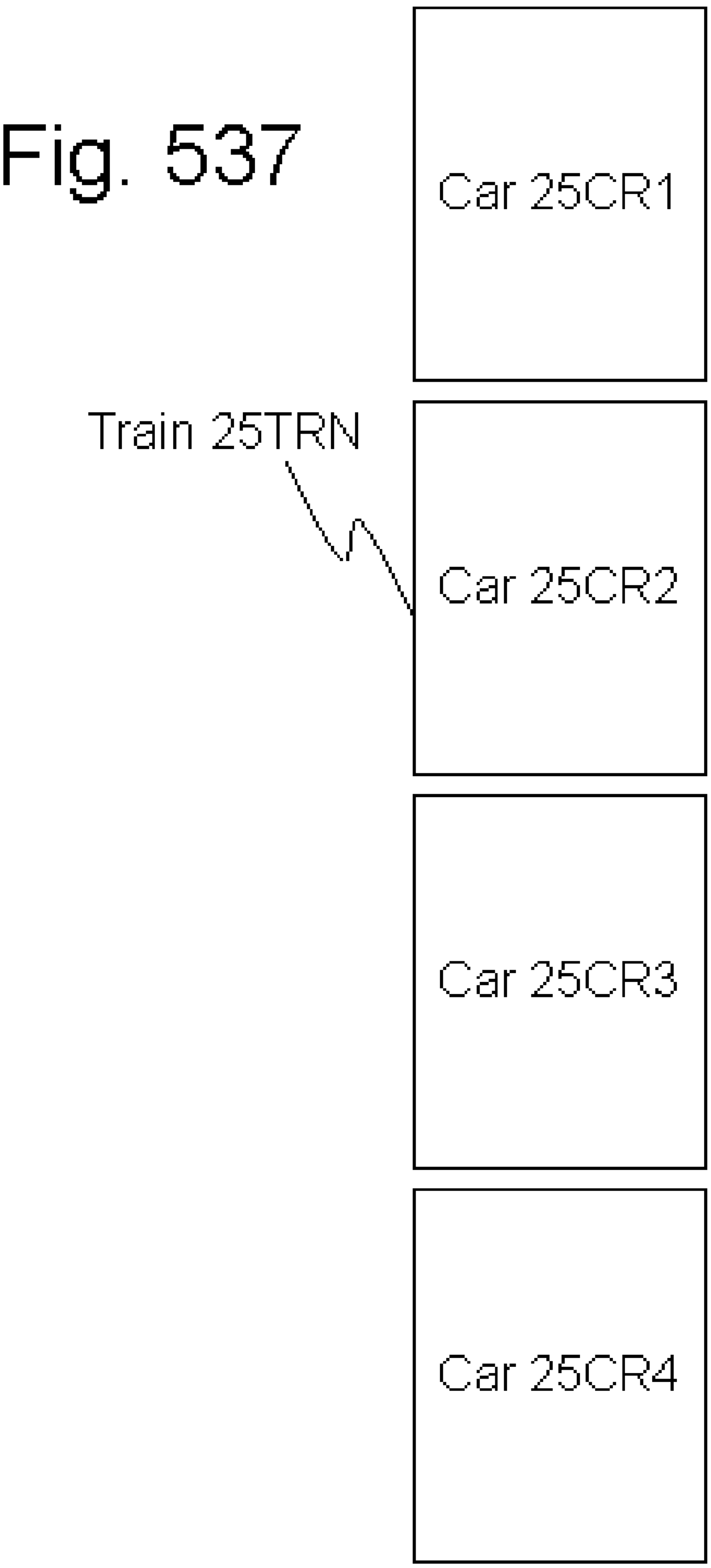

FIG. 537 is a simplified illustration illustrating an exemplary embodiment of the present invention.

Figure 538:
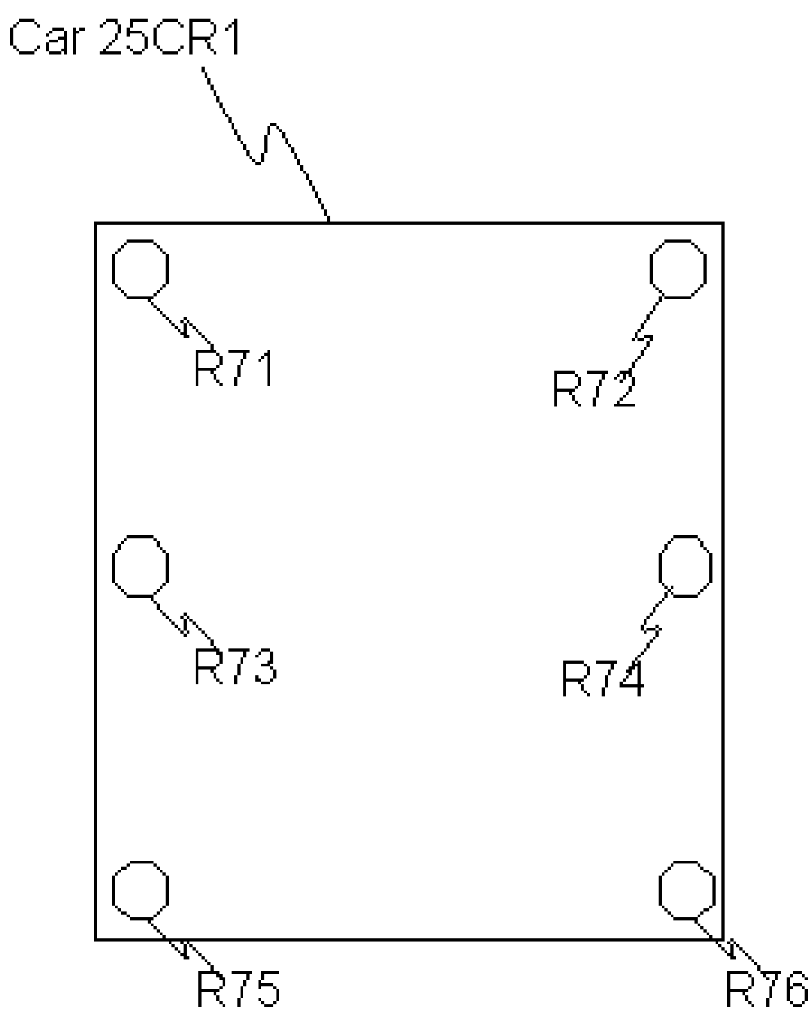

FIG. 538 is a simplified illustration illustrating an exemplary embodiment of the present invention.

Figure 539:
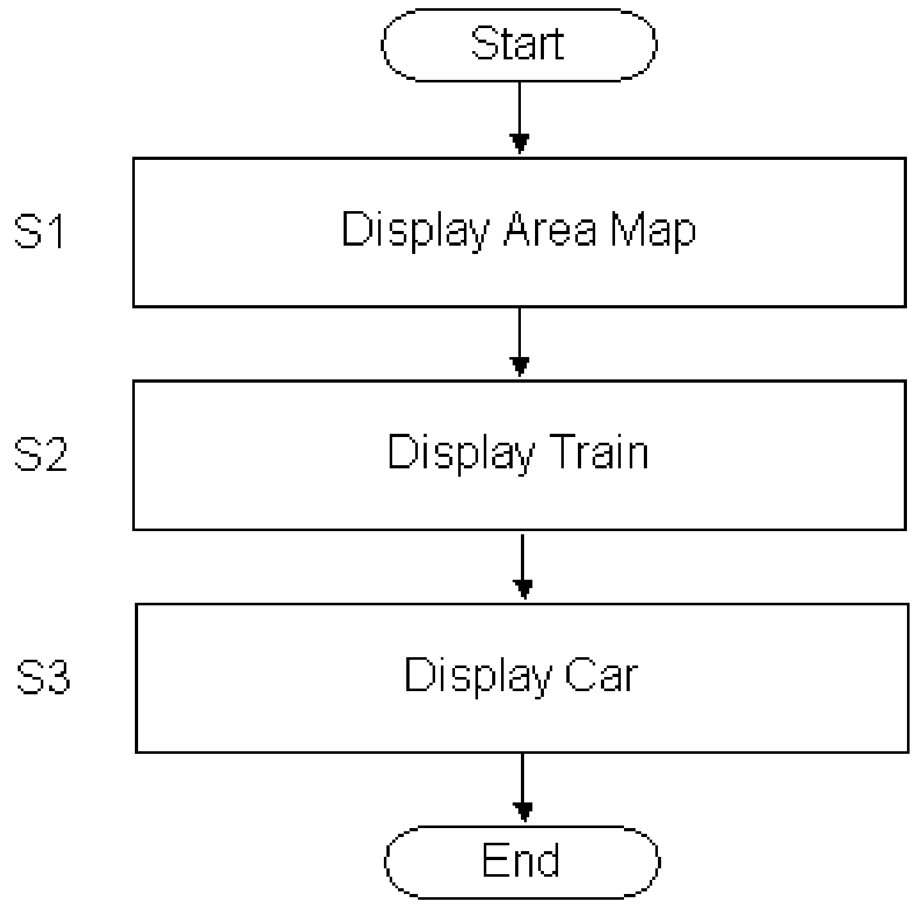

FIG. 539 is a simplified illustration illustrating an exemplary embodiment of the present invention.

Figure 540:
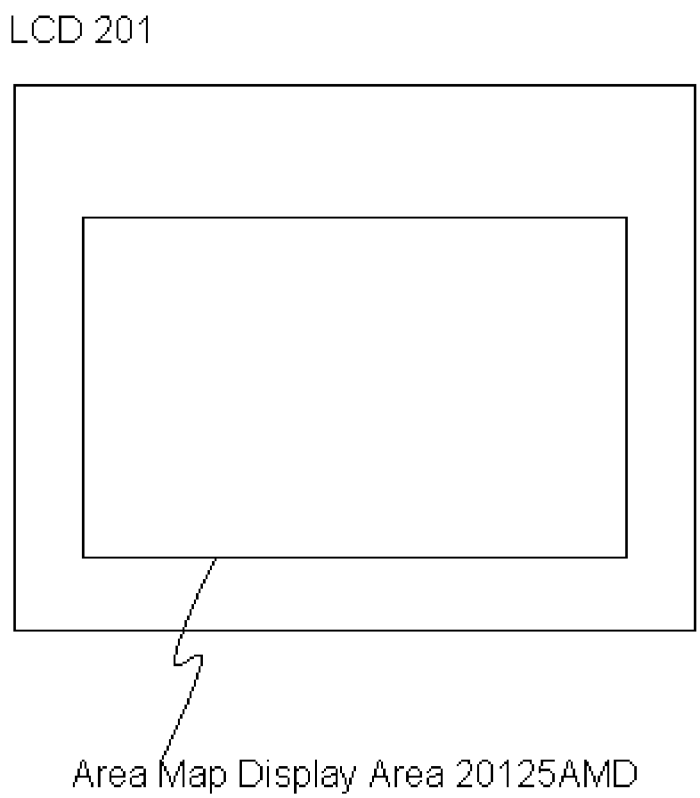

FIG. 540 is a simplified illustration illustrating an exemplary embodiment of the present invention.

Figure 541:
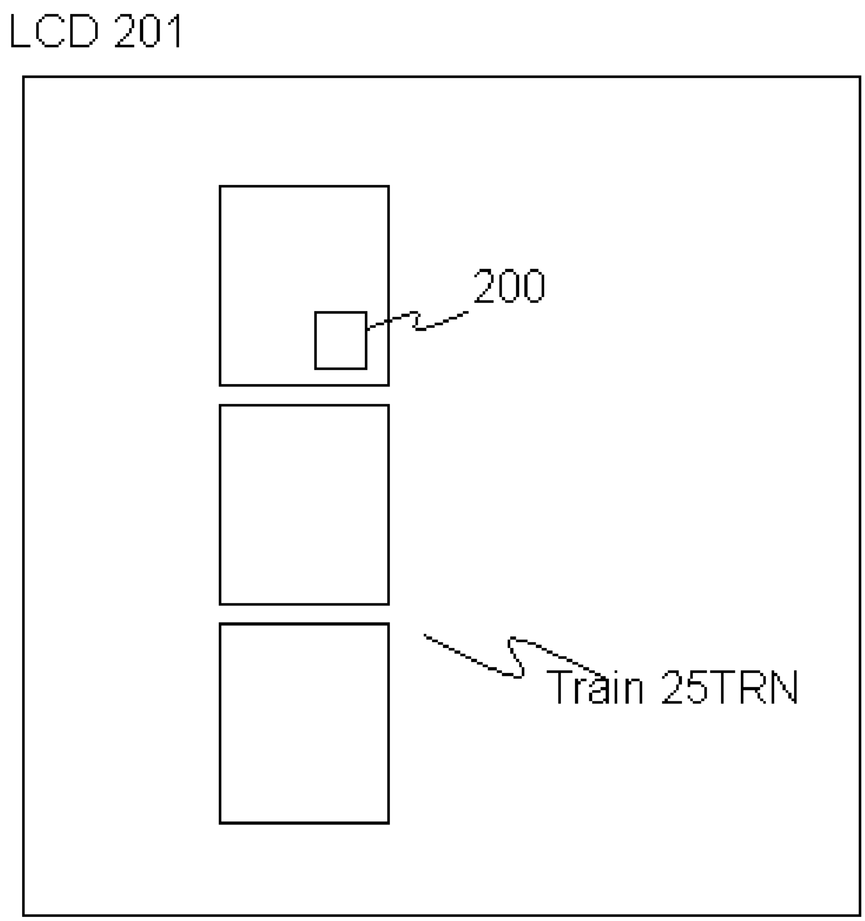

FIG. 541 is a simplified illustration illustrating an exemplary embodiment of the present invention.

Figure 542:
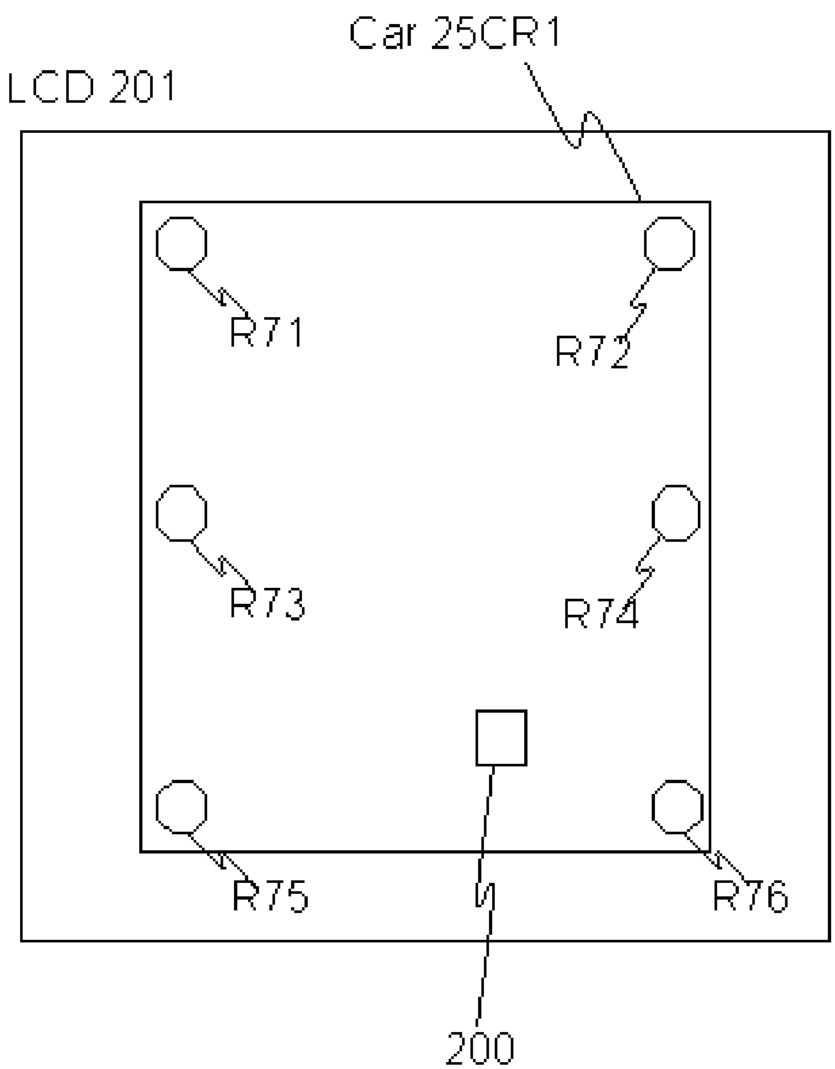

FIG. 542 is a block diagram illustrating an exemplary embodiment of the present invention.

Figure 543:
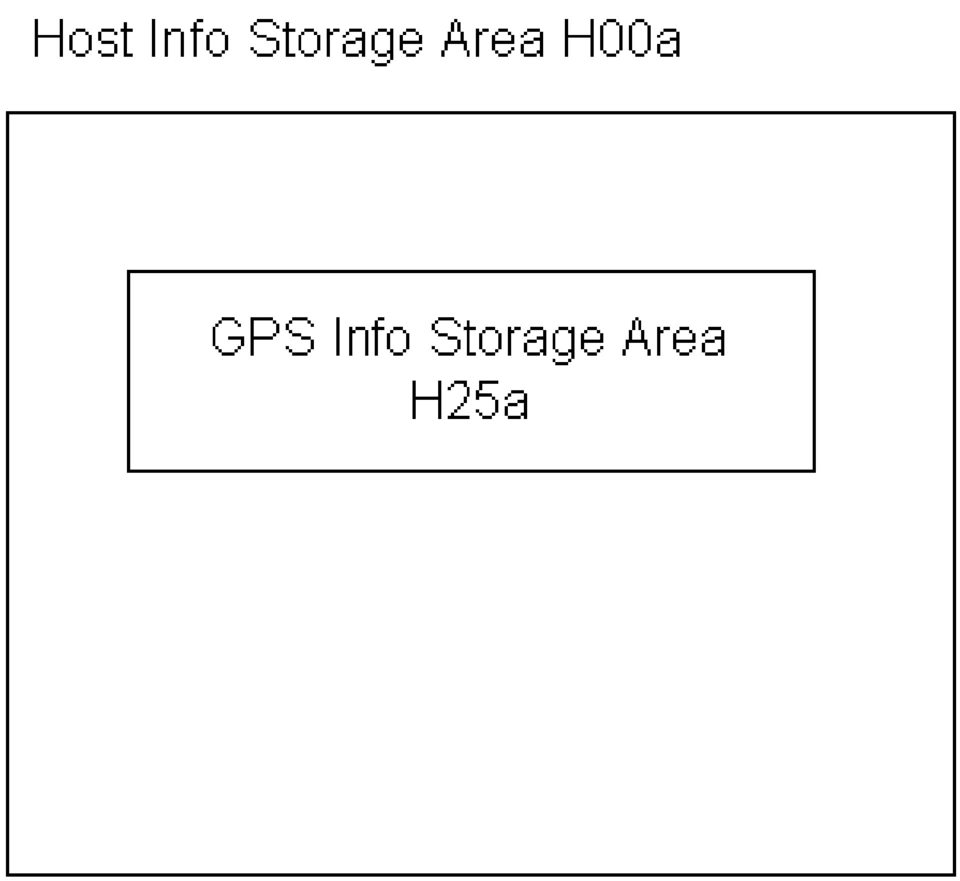

FIG. 543 is a block diagram illustrating an exemplary embodiment of the present invention.

Figure 544:
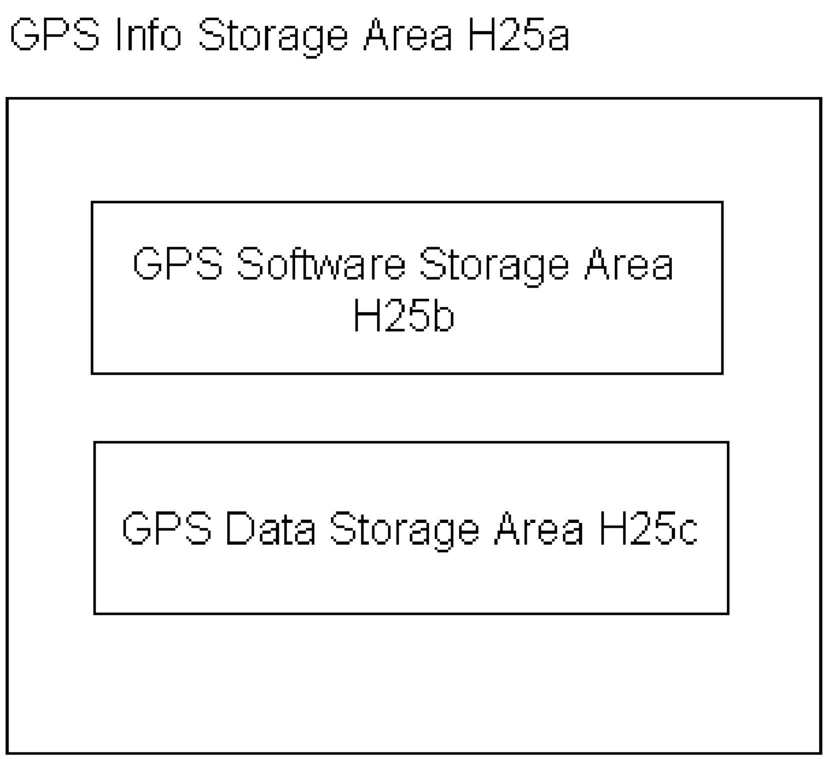

FIG. 544 is a block diagram illustrating an exemplary embodiment of the present invention.

Figure 545:
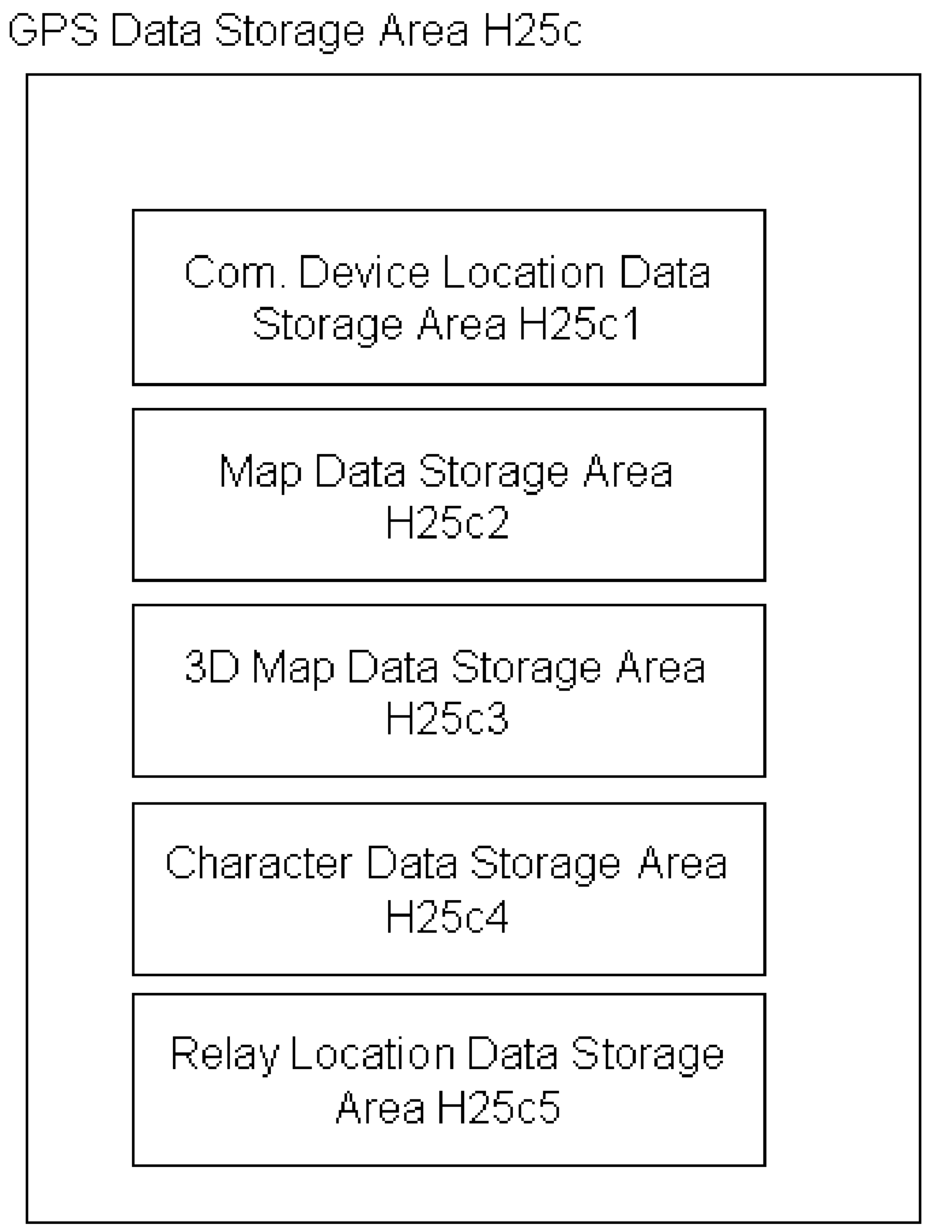

FIG. 545 is a block diagram illustrating an exemplary embodiment of the present invention.

FIG. 545*a* is a block diagram illustrating an exemplary embodiment of the present invention.

Figure 546:
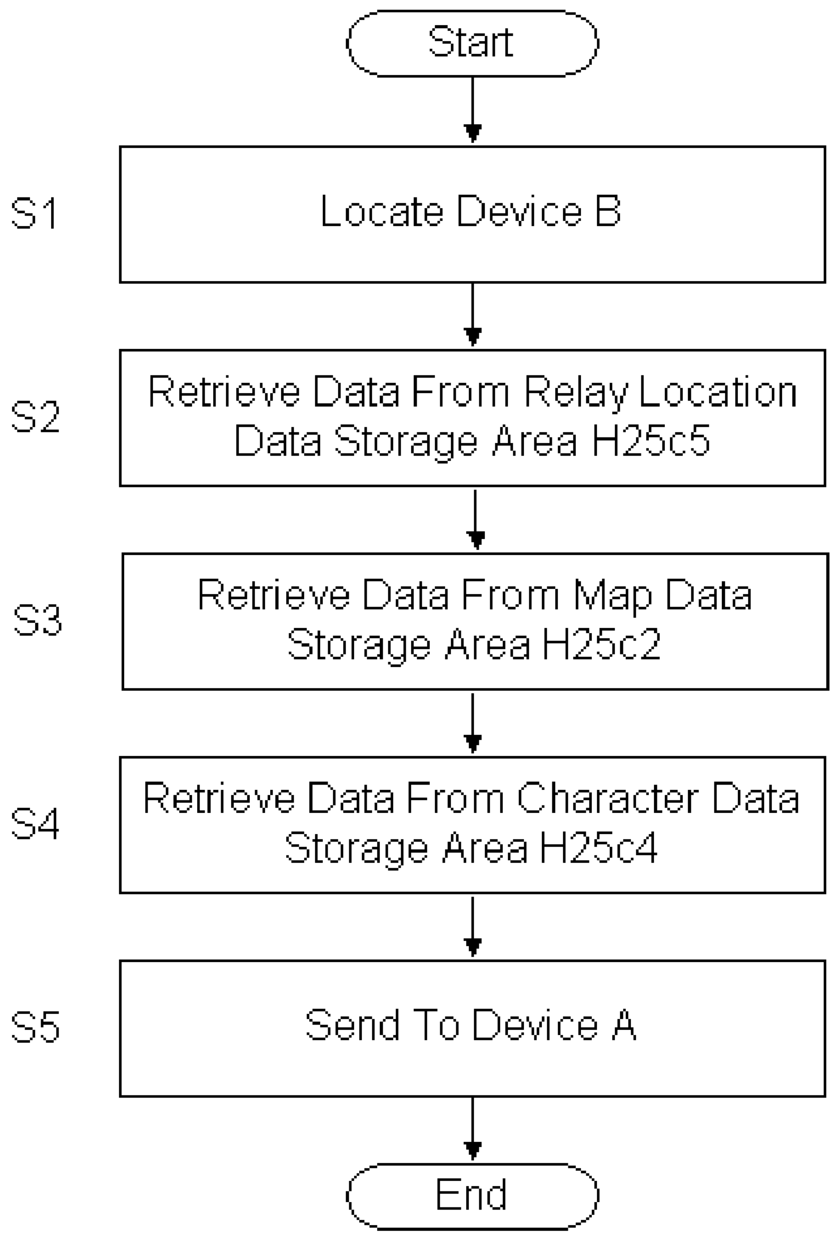

FIG. 546 is a flowchart illustrating an exemplary embodiment of the present invention.

Figure 547:
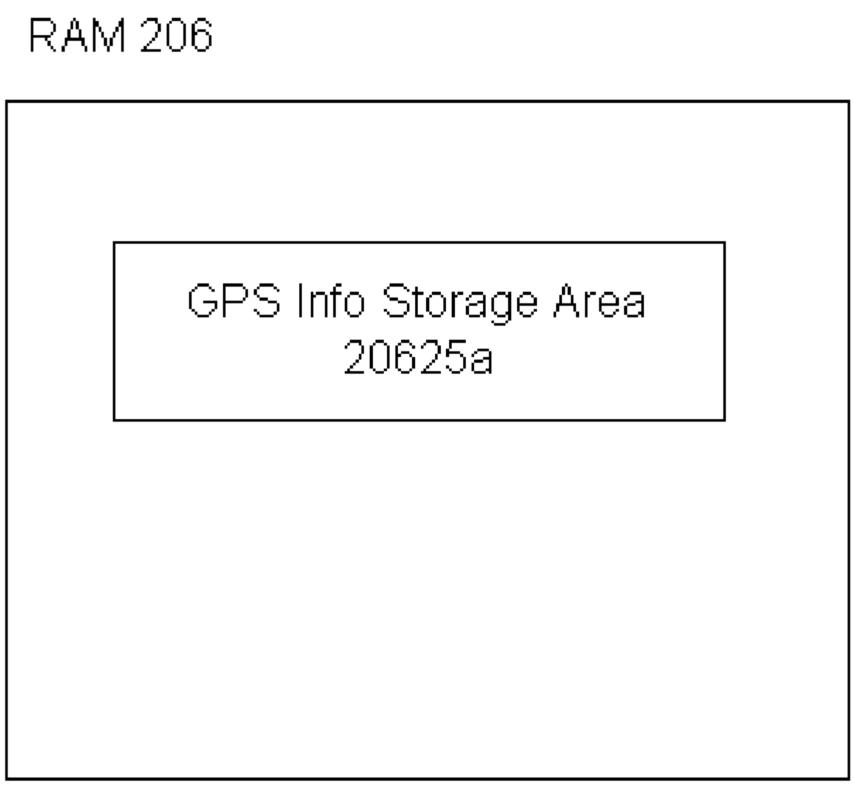

FIG. 547 is a block diagram illustrating an exemplary embodiment of the present invention.

Figure 548:
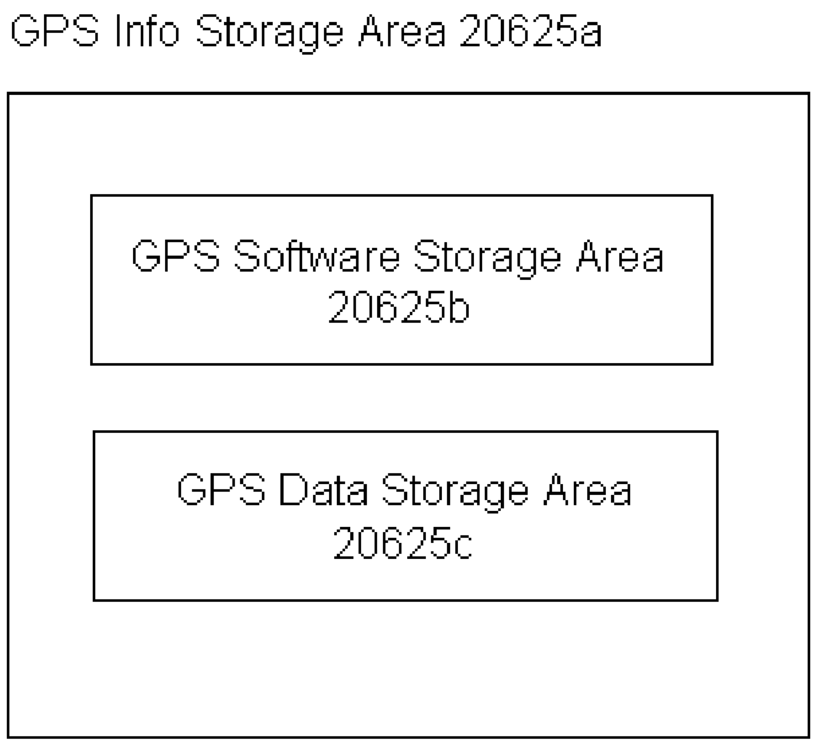

FIG. 548 is a block diagram illustrating an exemplary embodiment of the present invention.

Figure 549:
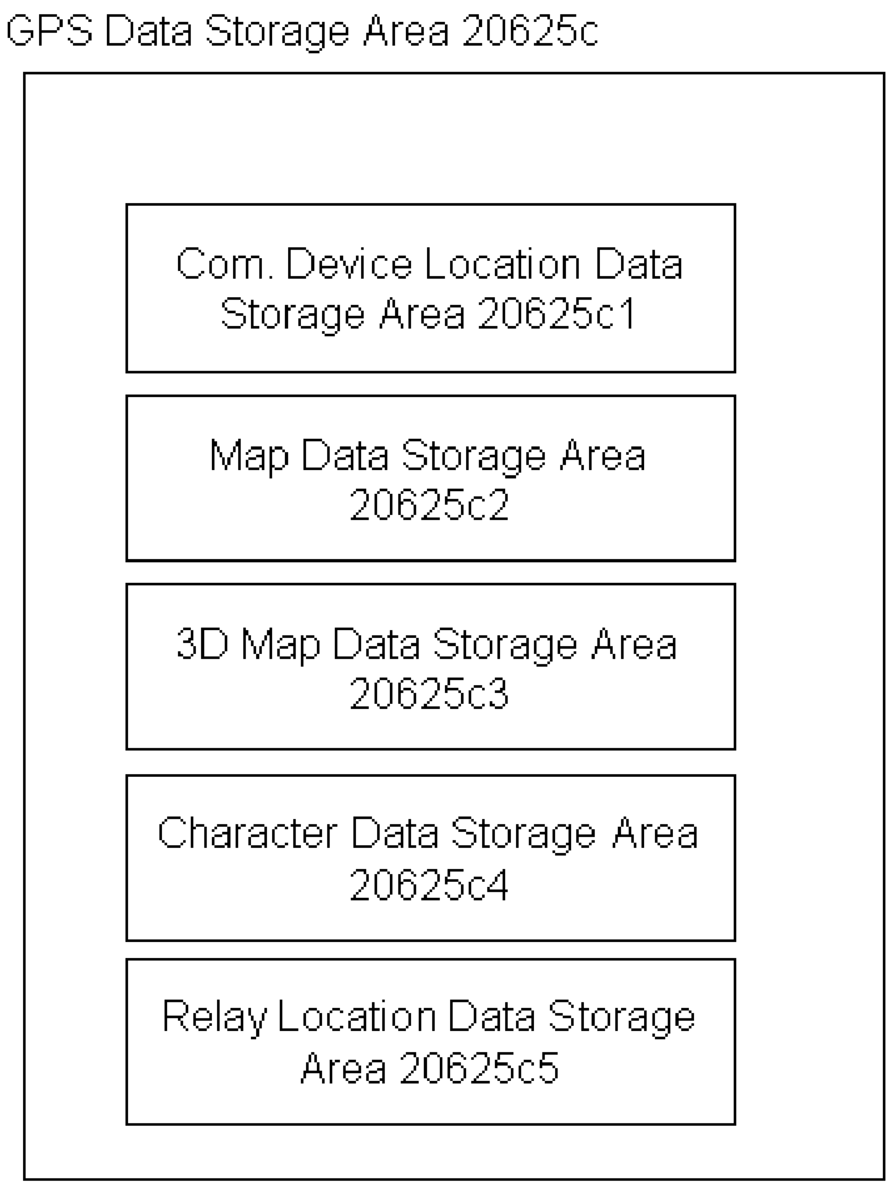

FIG. 549 is a block diagram illustrating an exemplary embodiment of the present invention.

FIG. 549*a* is a block diagram illustrating an exemplary embodiment of the present invention.

Figure 550:
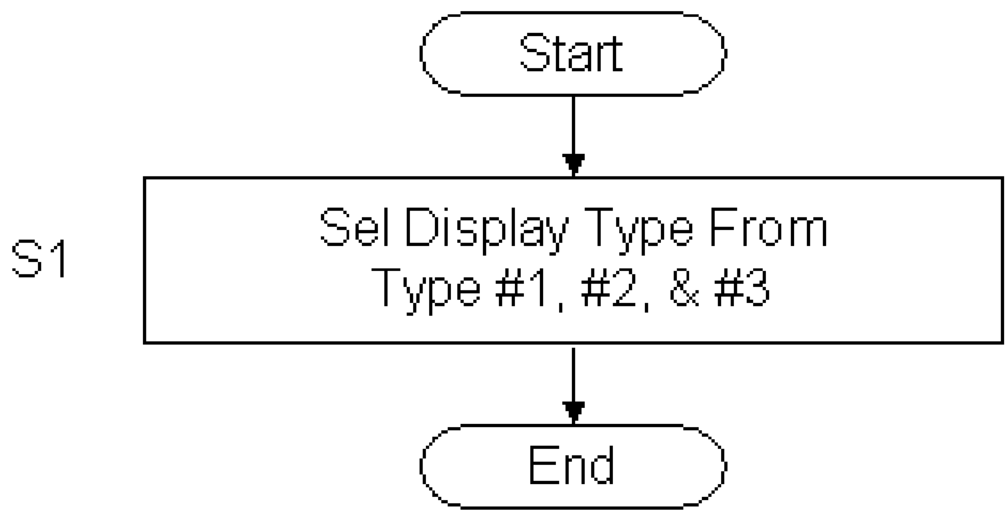

FIG. 550 is a flowchart illustrating an exemplary embodiment of the present invention.

Figure 551:
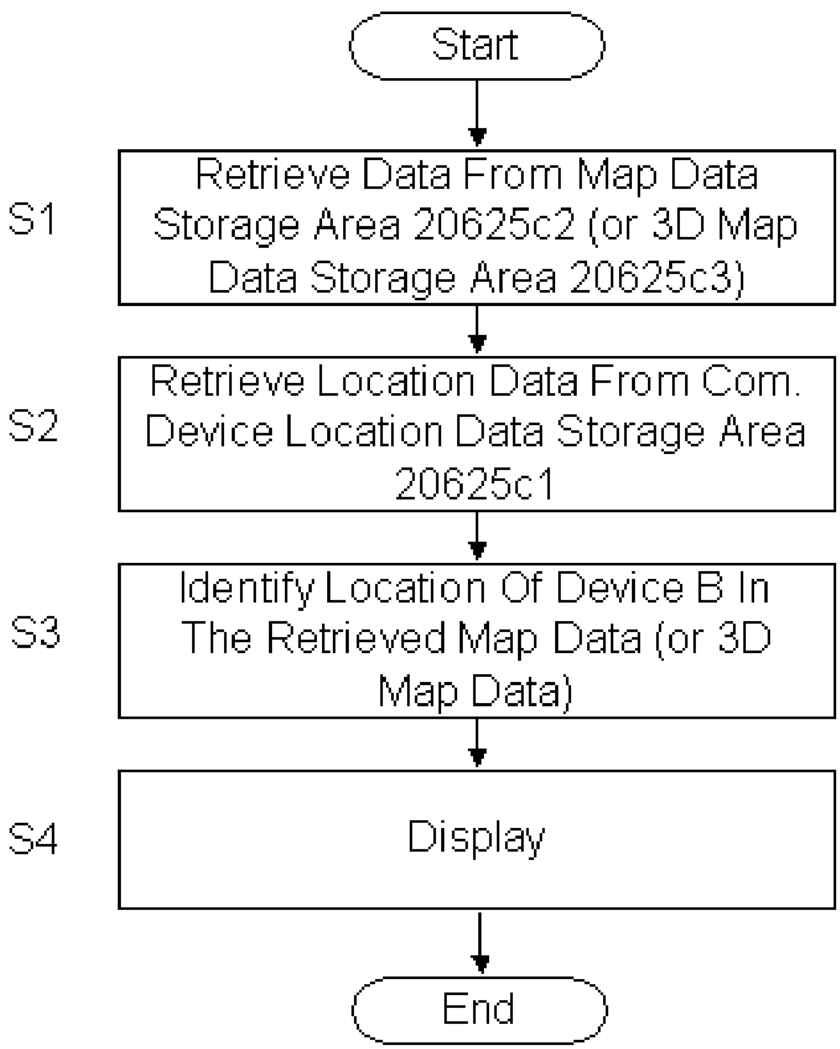

FIG. 551 is a flowchart illustrating an exemplary embodiment of the present invention.

Figure 552:
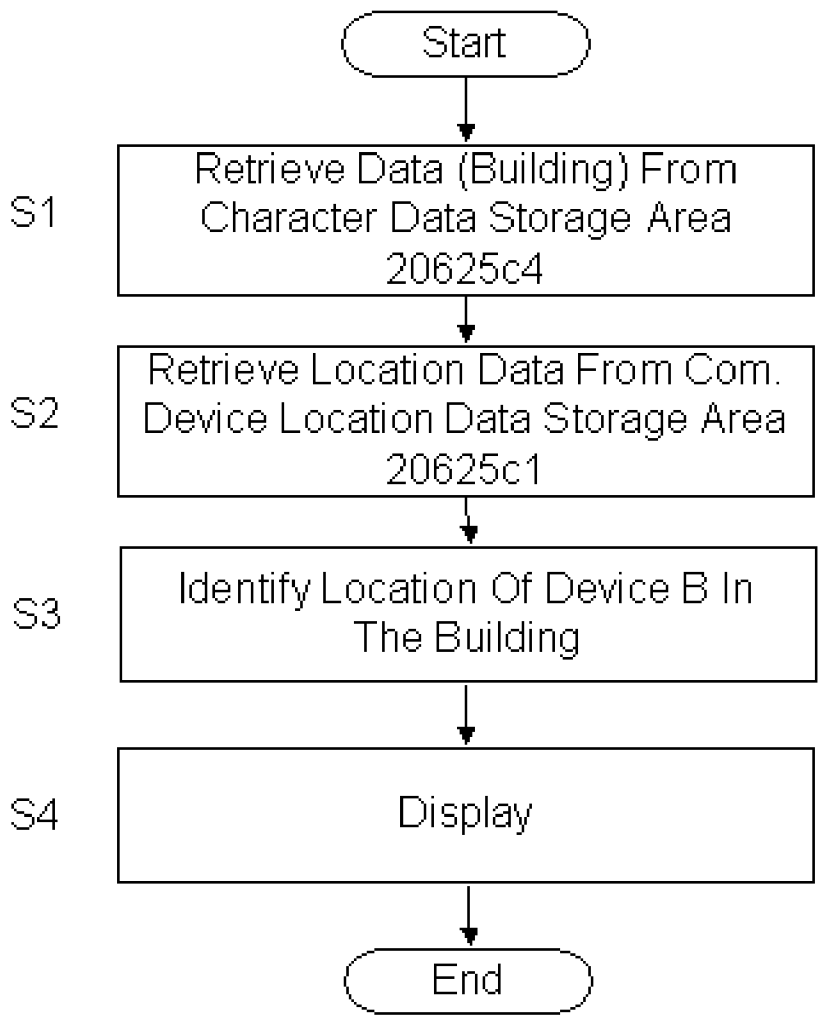

FIG. 552 is a flowchart illustrating an exemplary embodiment of the present invention.

Figure 553:
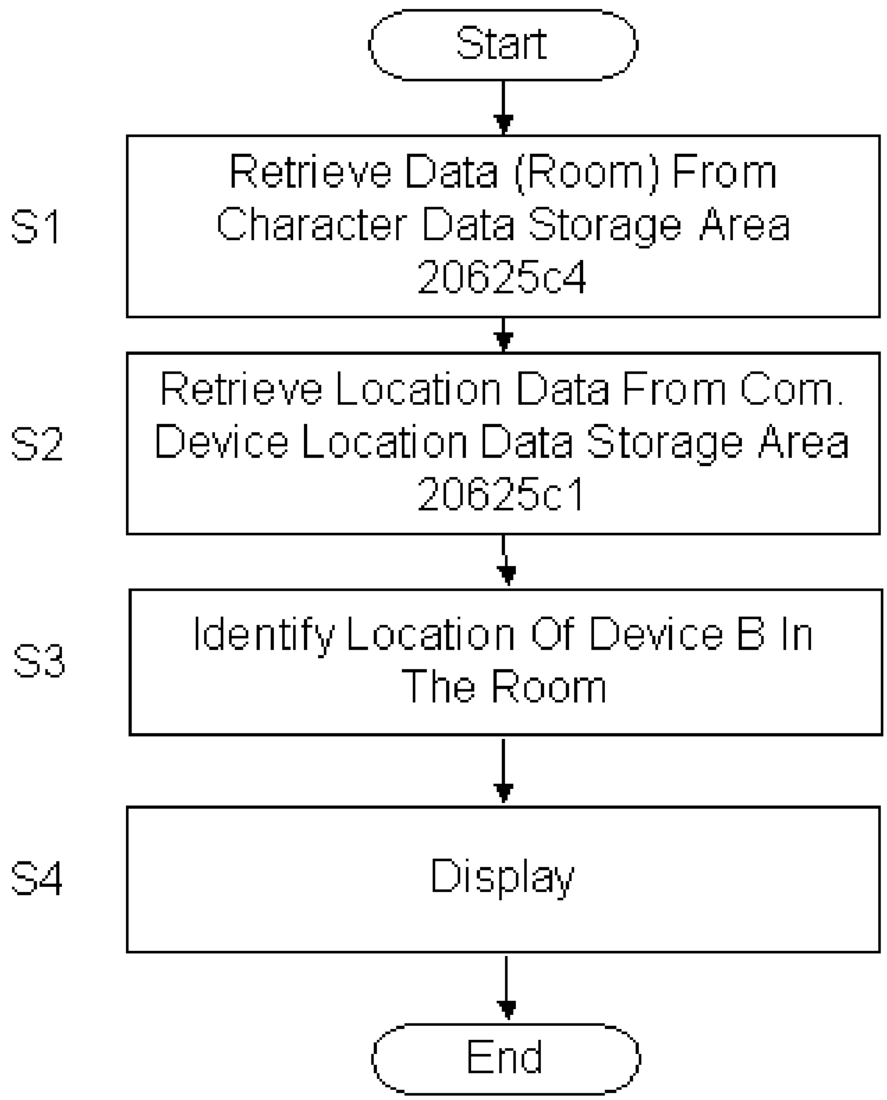

FIG. 553 is a flowchart illustrating an exemplary embodiment of the present invention.

Figure 554:
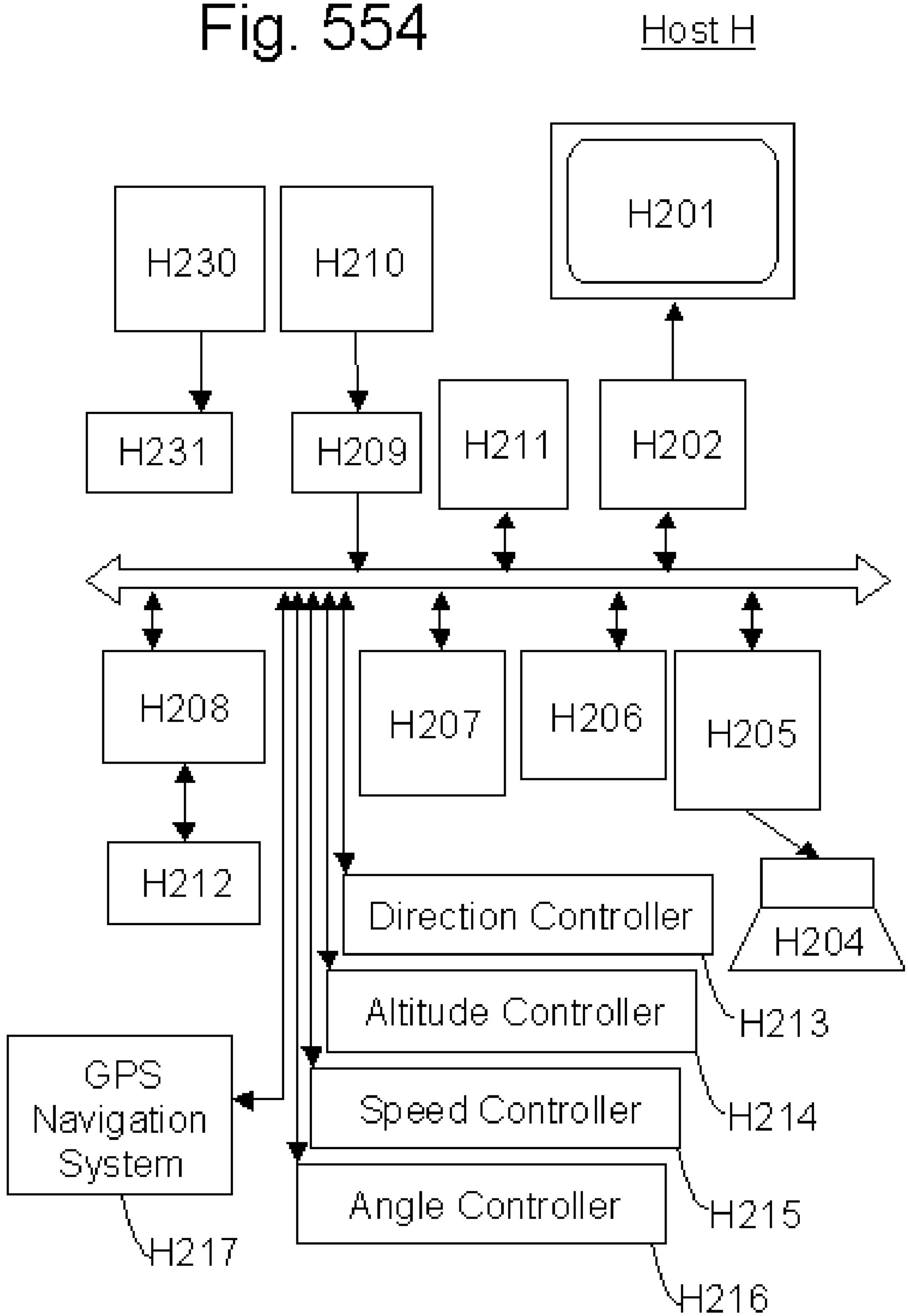

FIG. 554 is a block diagram illustrating an exemplary embodiment of the present invention.

Figure 555:
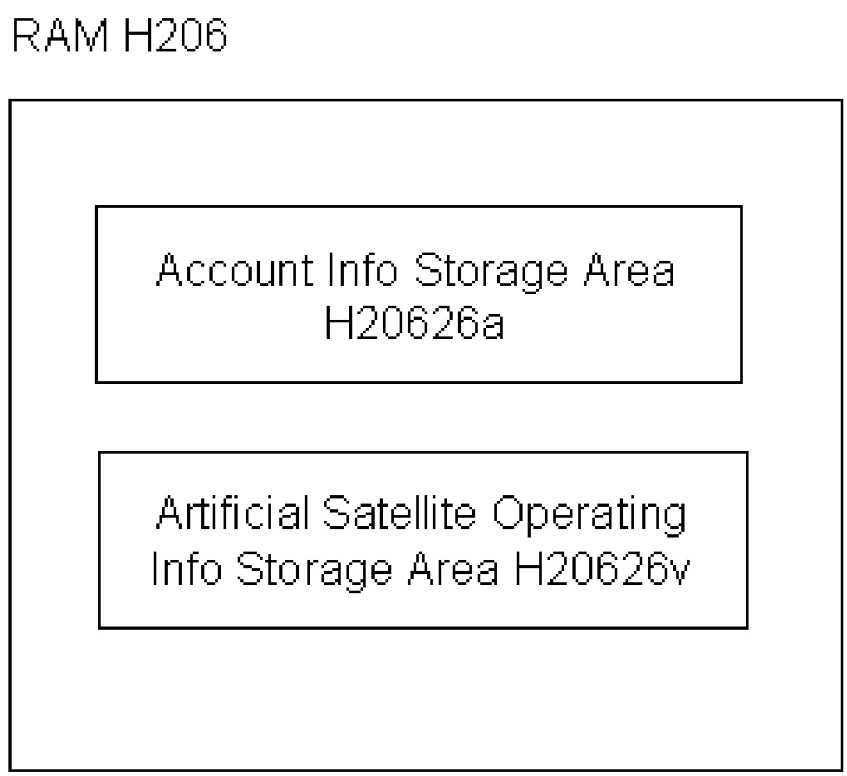

FIG. 555 is a block diagram illustrating an exemplary embodiment of the present invention.

Figure 556:
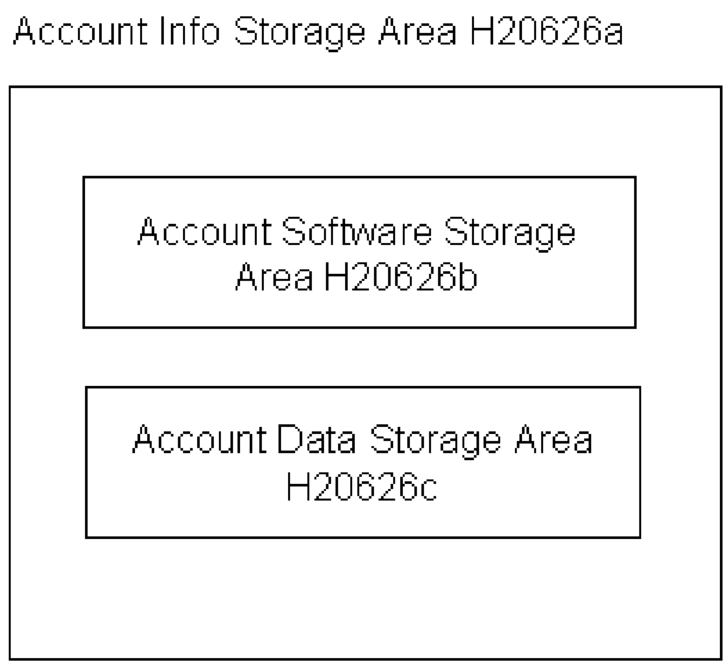

FIG. 556 is a block diagram illustrating an exemplary embodiment of the present invention.

FIG. 557 is a block diagram illustrating an exemplary embodiment of the present invention.

Figure 558:
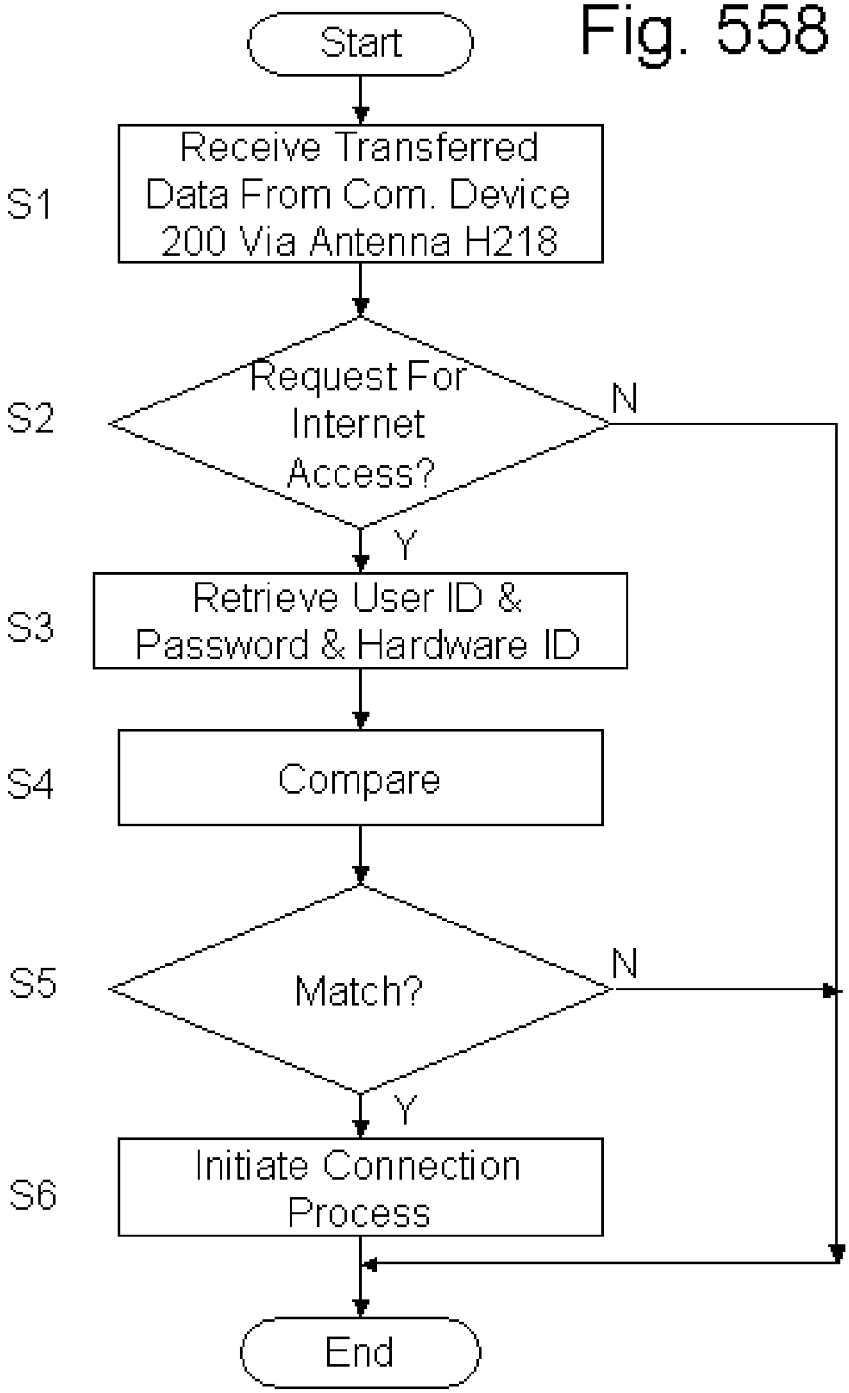

FIG. 558 is a flowchart illustrating an exemplary embodiment of the present invention.

Figure 559:
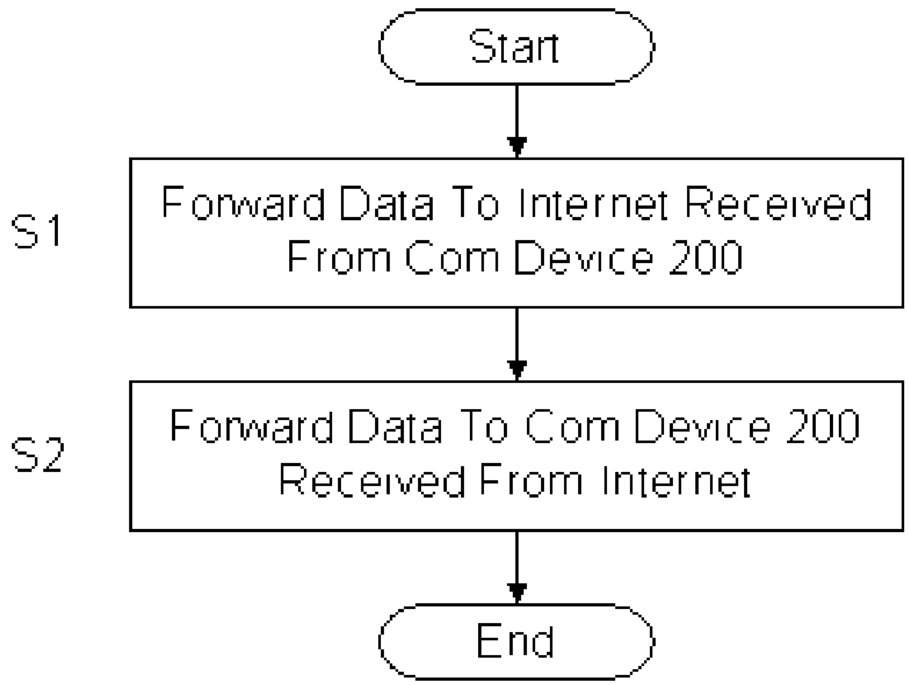

FIG. 559 is a flowchart illustrating an exemplary embodiment of the present invention.

Figure 560:
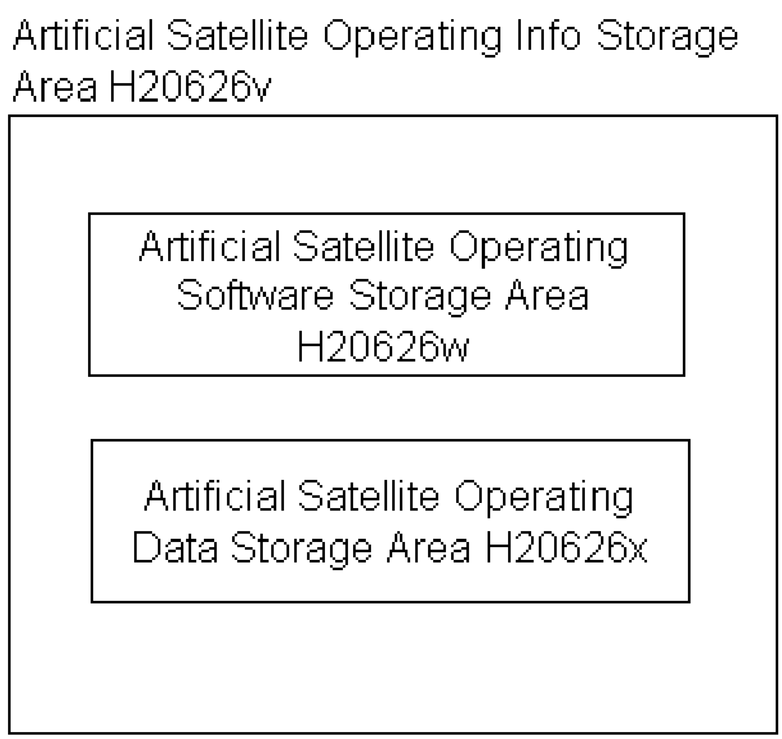

FIG. 560 is a block diagram illustrating an exemplary embodiment of the present invention.

Figure 561:
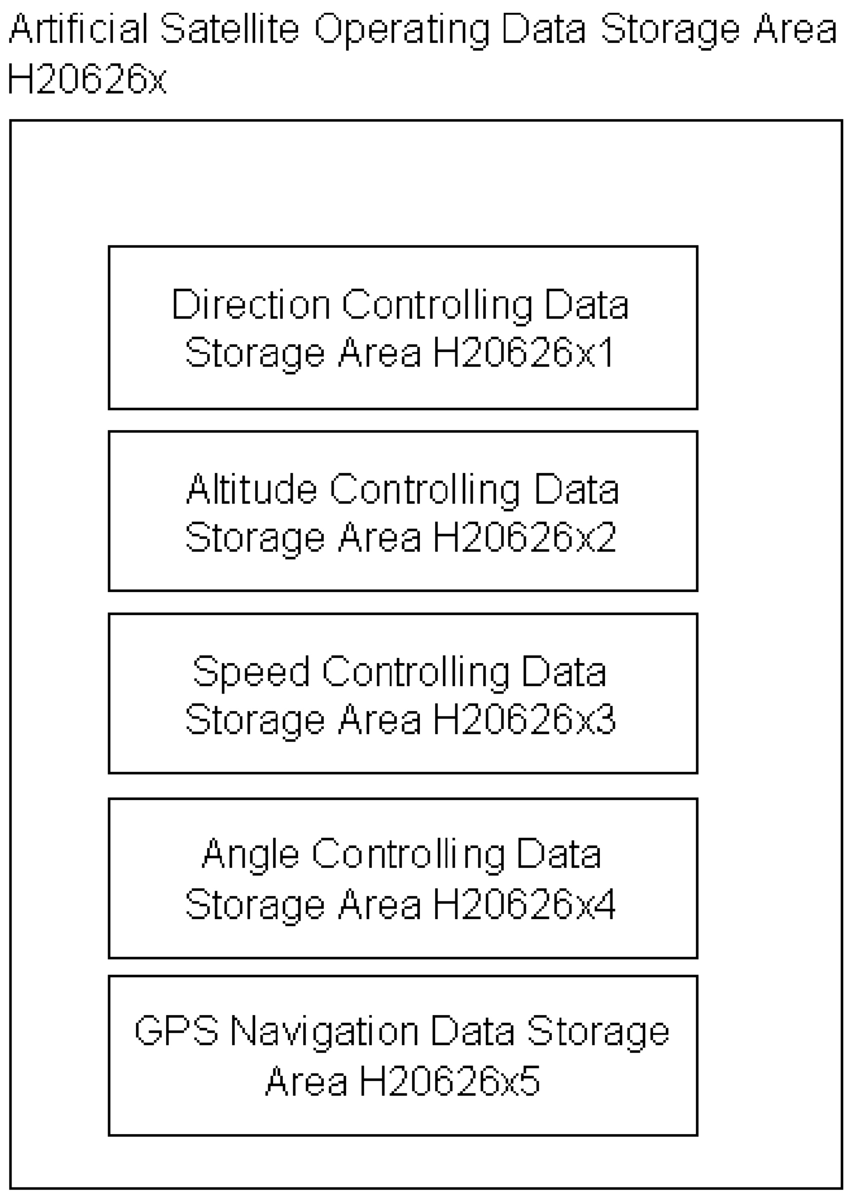

FIG. 561 is a block diagram illustrating an exemplary embodiment of the present invention.

Figure 562:
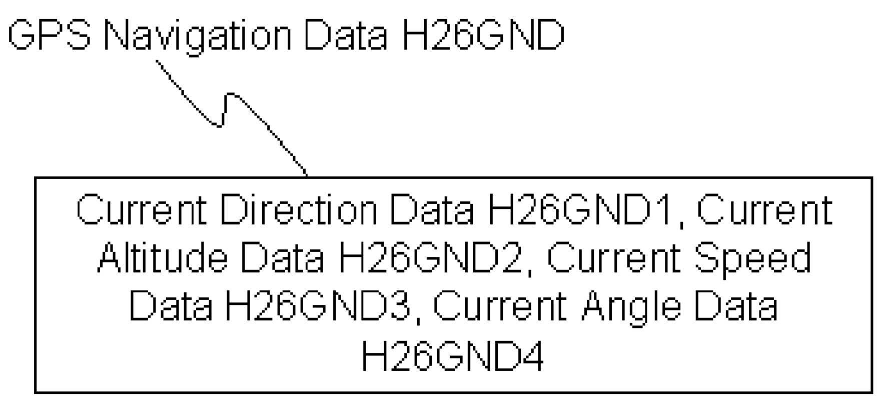

FIG. 562 is a simplified illustration illustrating an exemplary embodiment of the present invention.

Figure 563:
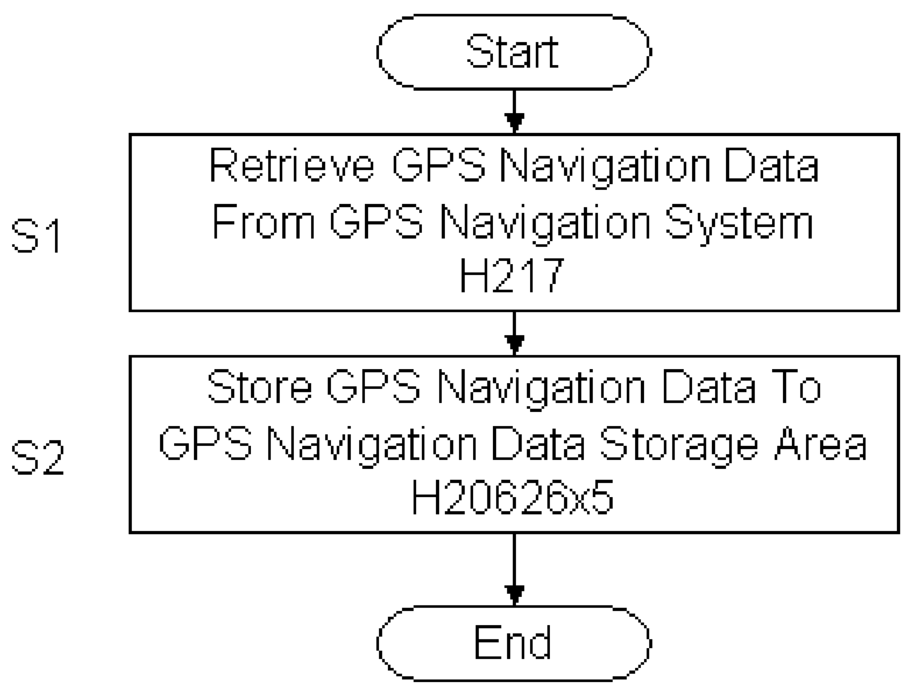

FIG. 563 is a flowchart illustrating an exemplary embodiment of the present invention.

Figure 564:
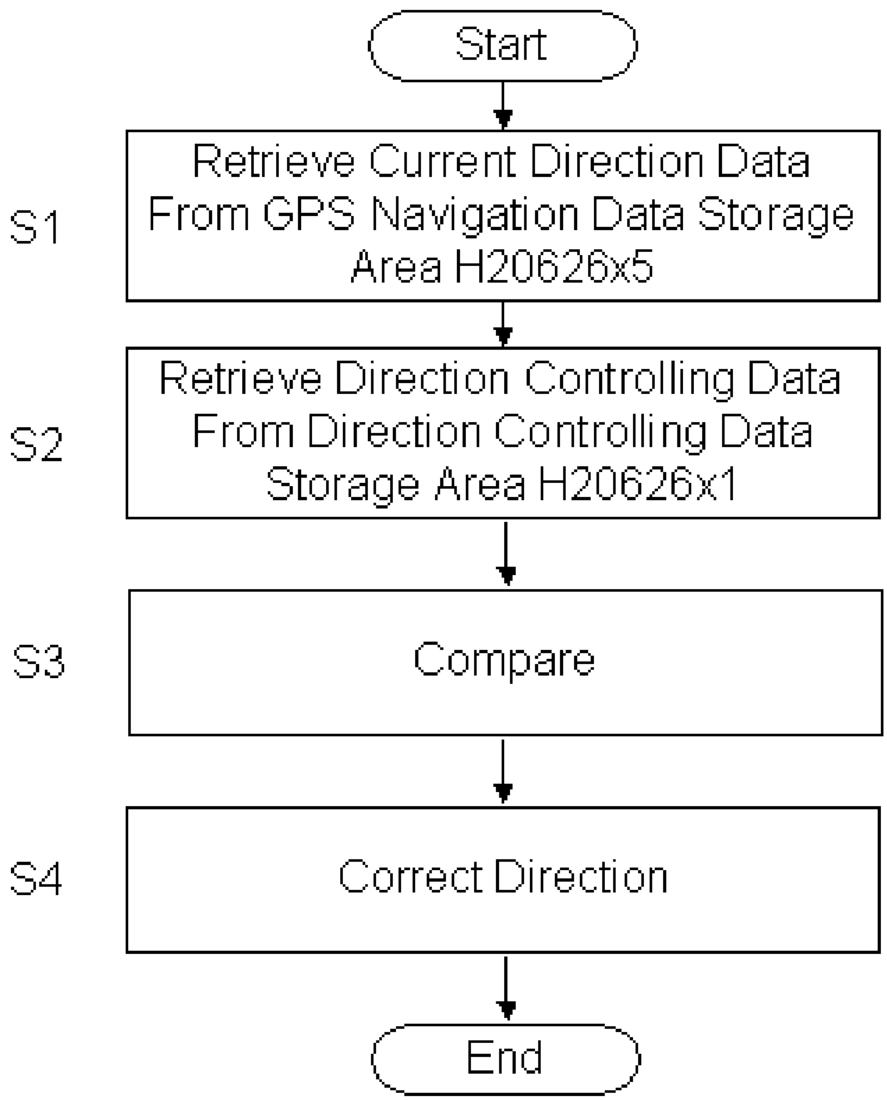

FIG. 564 is a flowchart illustrating an exemplary embodiment of the present invention.

Figure 565:
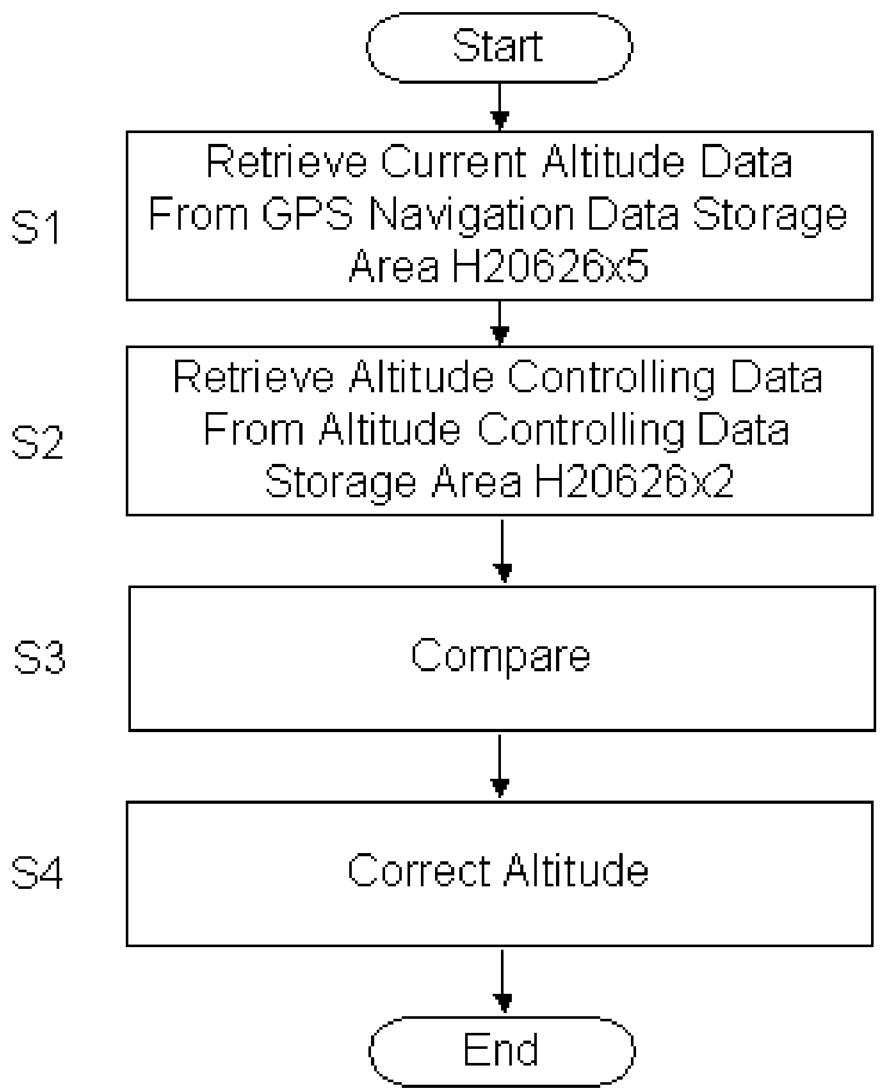

FIG. 565 is a flowchart illustrating an exemplary embodiment of the present invention.

Figure 566:
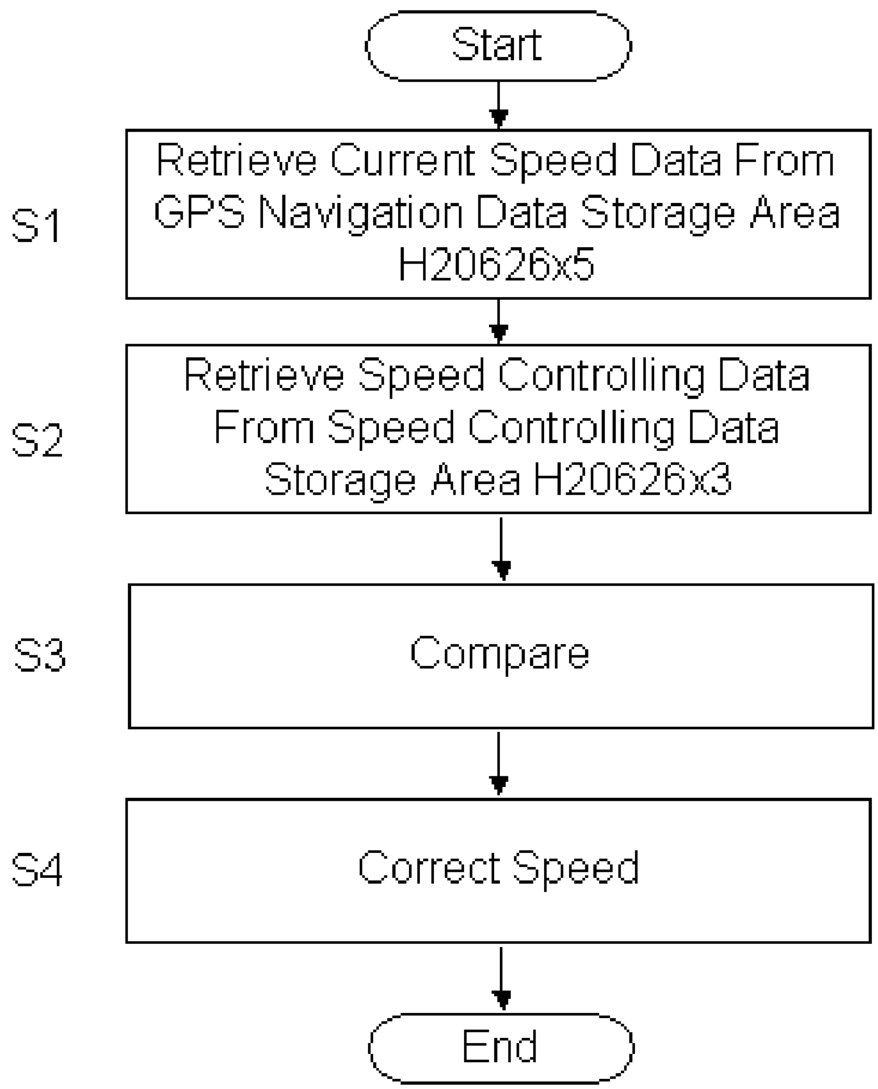

FIG. 566 is a flowchart illustrating an exemplary embodiment of the present invention.

Figure 567:
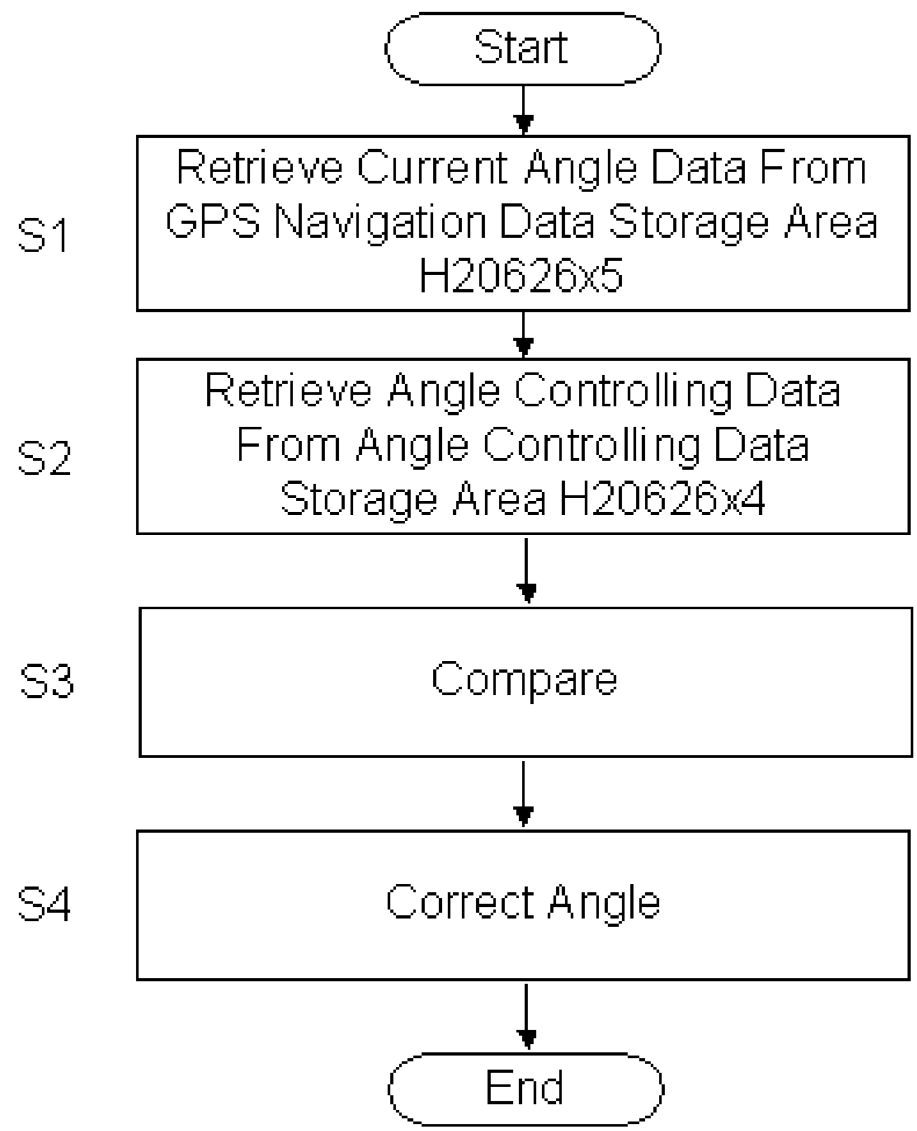

FIG. 567 is a flowchart illustrating an exemplary embodiment of the present invention.

Figure 568:
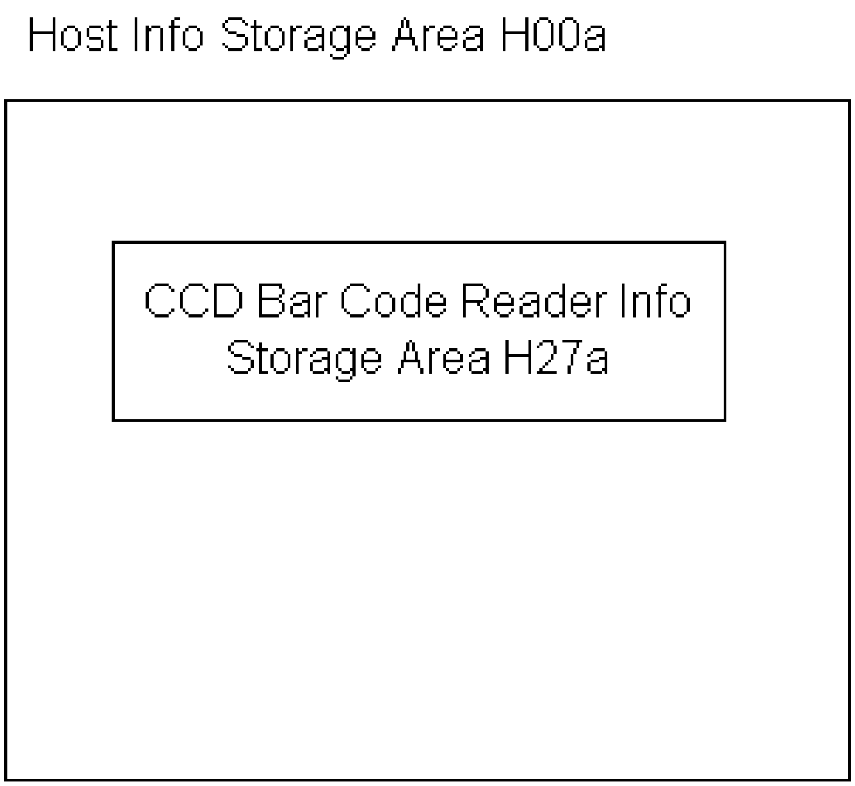

FIG. 568 is a block diagram illustrating an exemplary embodiment of the present invention.

Figure 569:
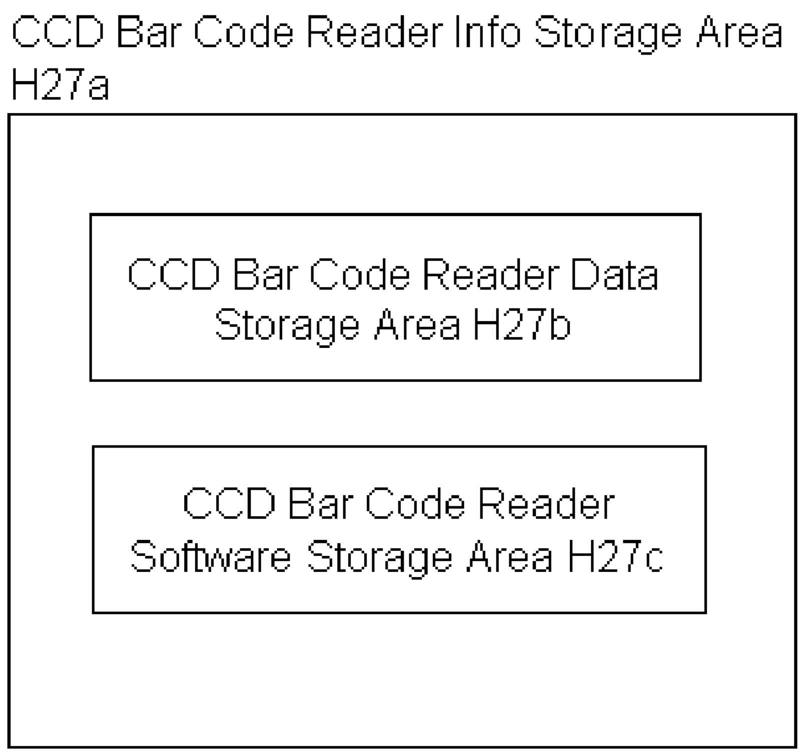

FIG. 569 is a block diagram illustrating an exemplary embodiment of the present invention.

Figure 570:
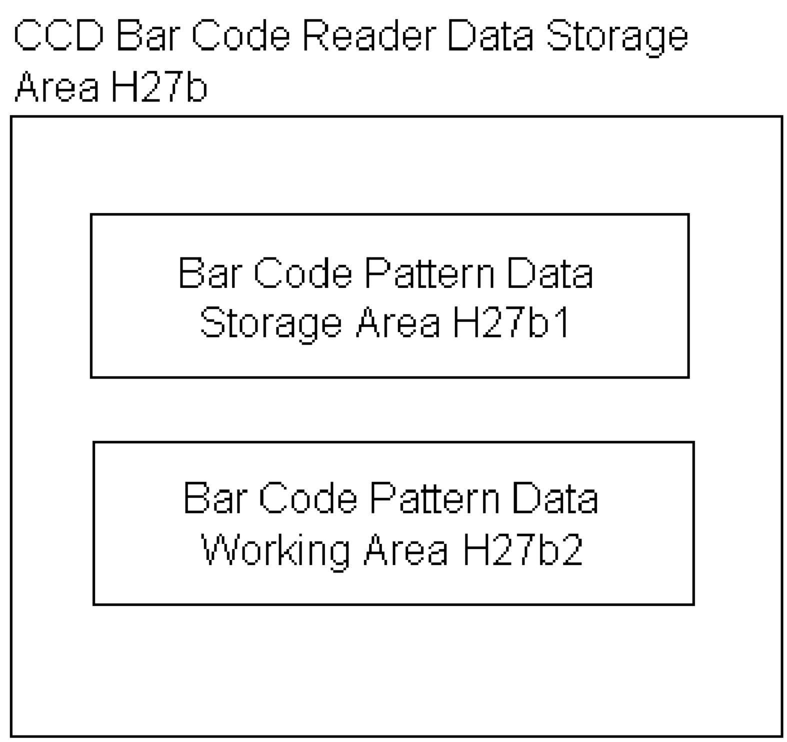

FIG. 570 is a block diagram illustrating an exemplary embodiment of the present invention.

FIG. 571 is a block diagram illustrating an exemplary embodiment of the present invention.

Figure 572:
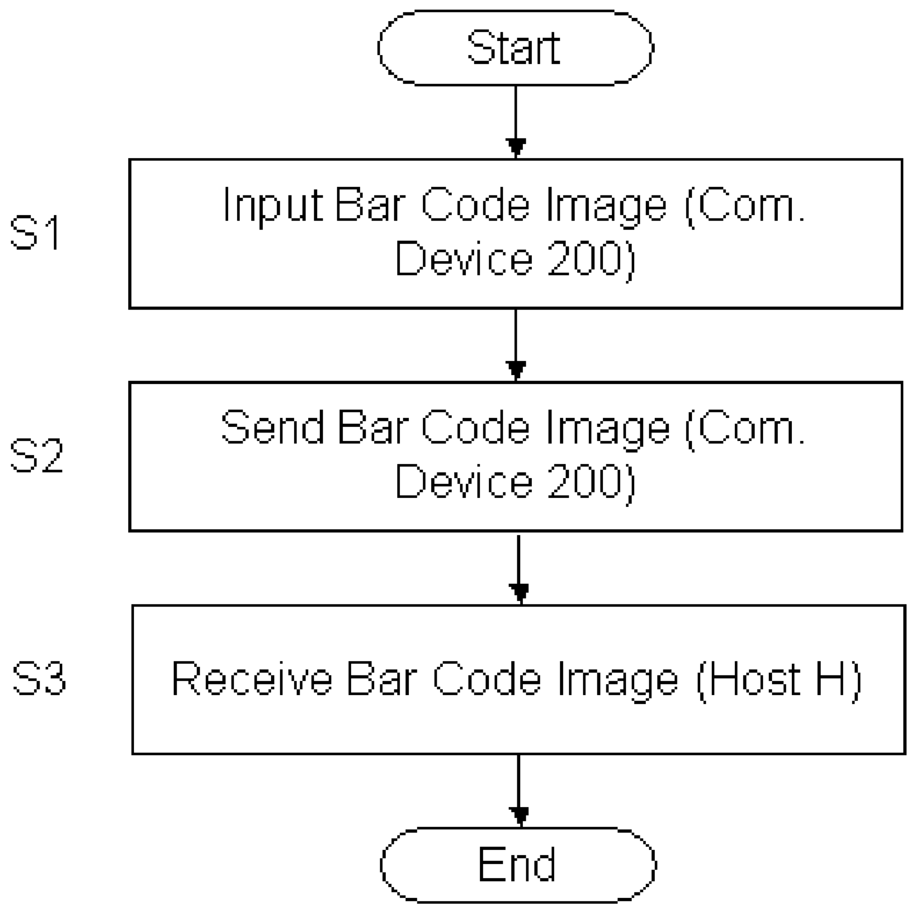

FIG. 572 is a flowchart illustrating an exemplary embodiment of the present invention.

Figure 573:
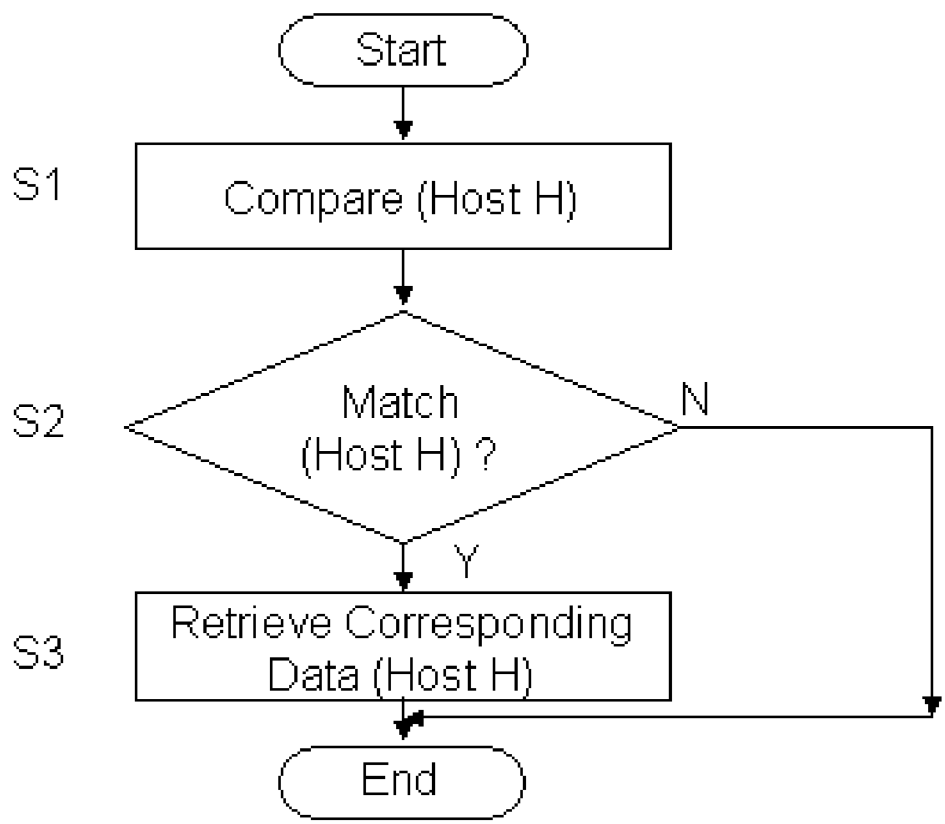

FIG. 573 is a flowchart illustrating an exemplary embodiment of the present invention.

Figure 574:
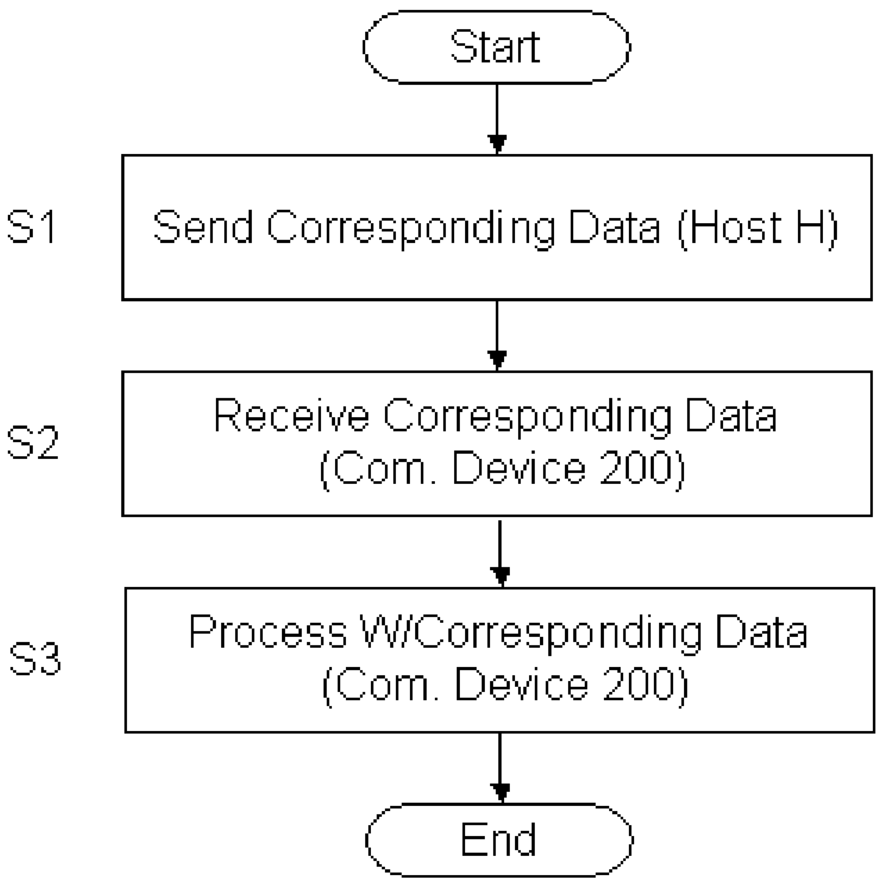

FIG. 574 is a flowchart illustrating an exemplary embodiment of the present invention.

Figure 575:
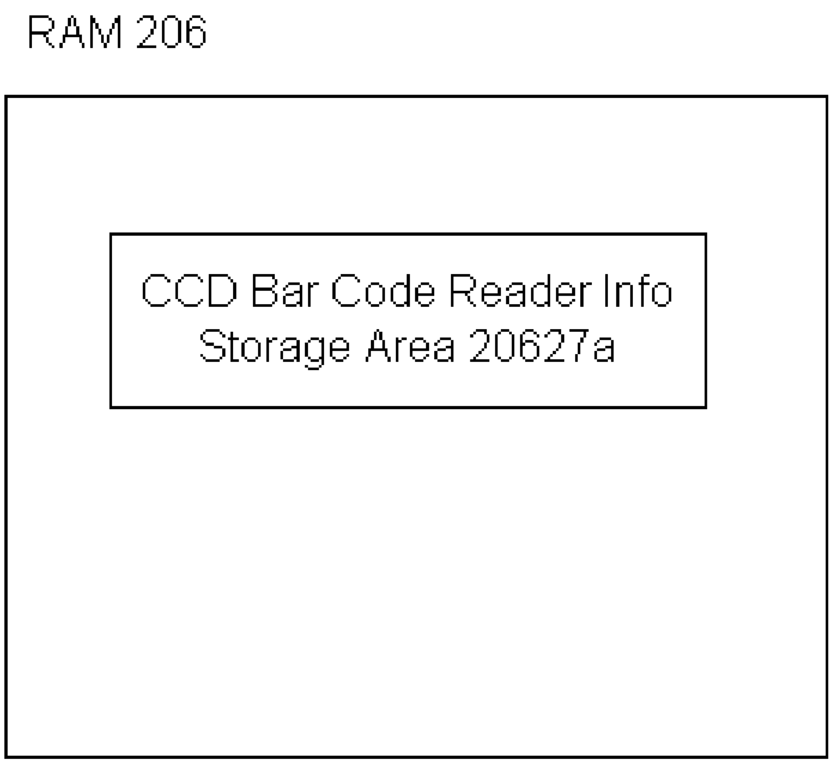

FIG. 575 is a block diagram illustrating an exemplary embodiment of the present invention.

Figure 576:
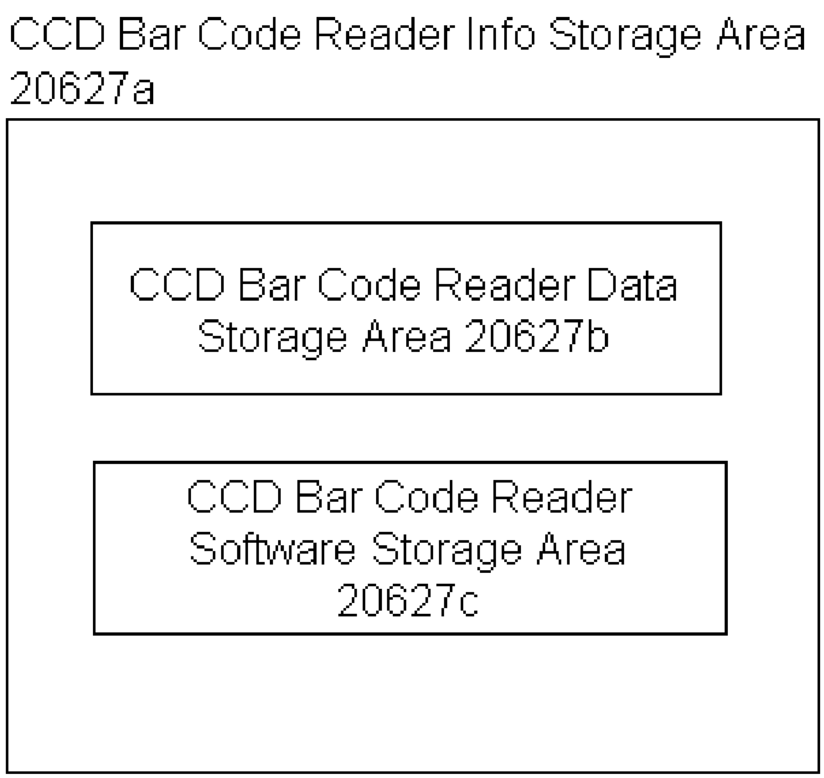

FIG. 576 is a block diagram illustrating an exemplary embodiment of the present invention.

Figure 577:
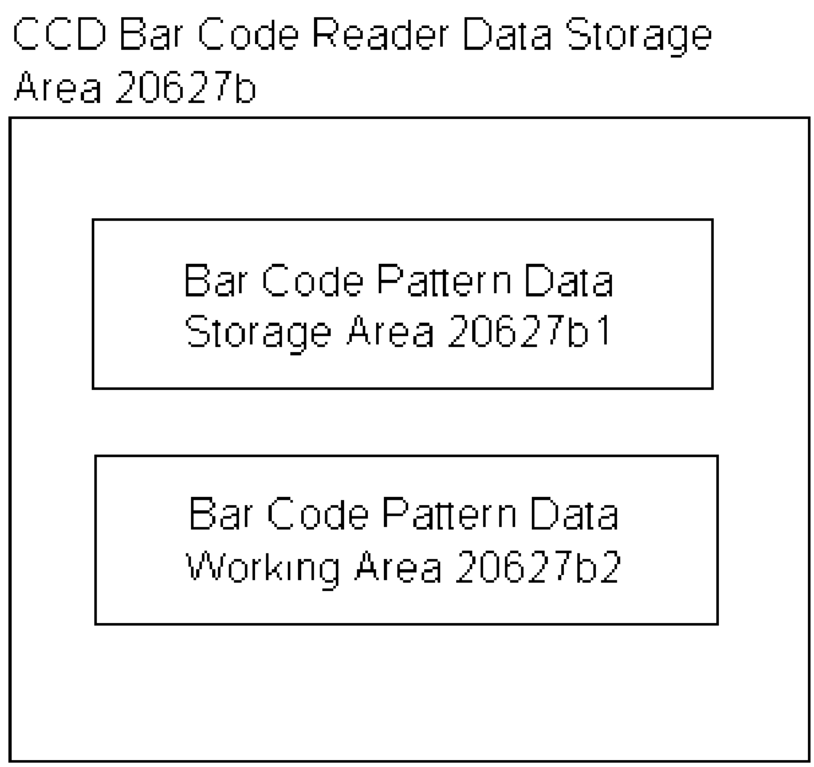

FIG. 577 is a block diagram illustrating an exemplary embodiment of the present invention.

FIG. 578 is a block diagram illustrating an exemplary embodiment of the present invention.

Figure 579:
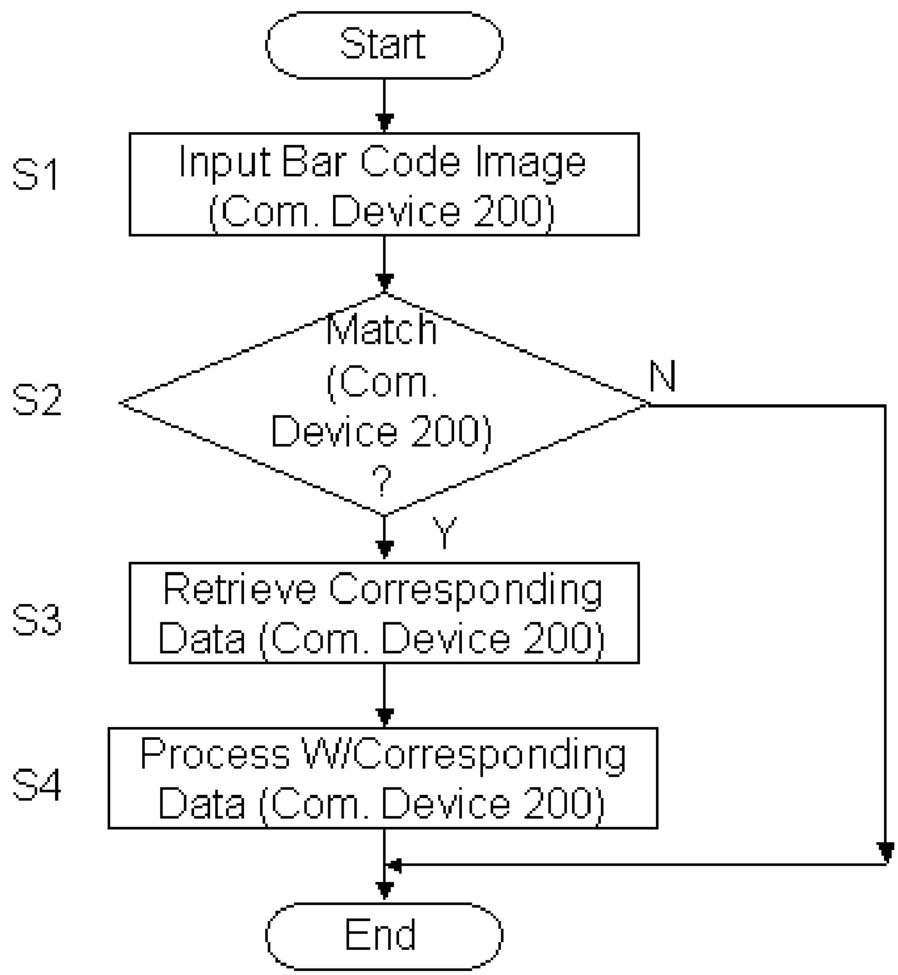

FIG. 579 is a flowchart illustrating an exemplary embodiment of the present invention.

Figure 580:
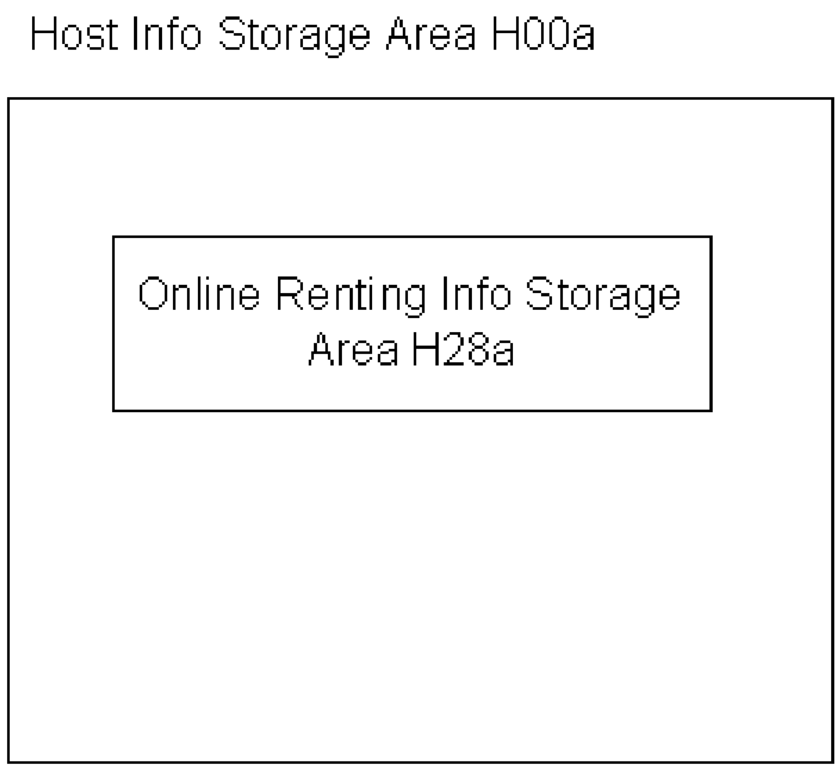

FIG. 580 is a block diagram illustrating an exemplary embodiment of the present invention.

Figure 581:
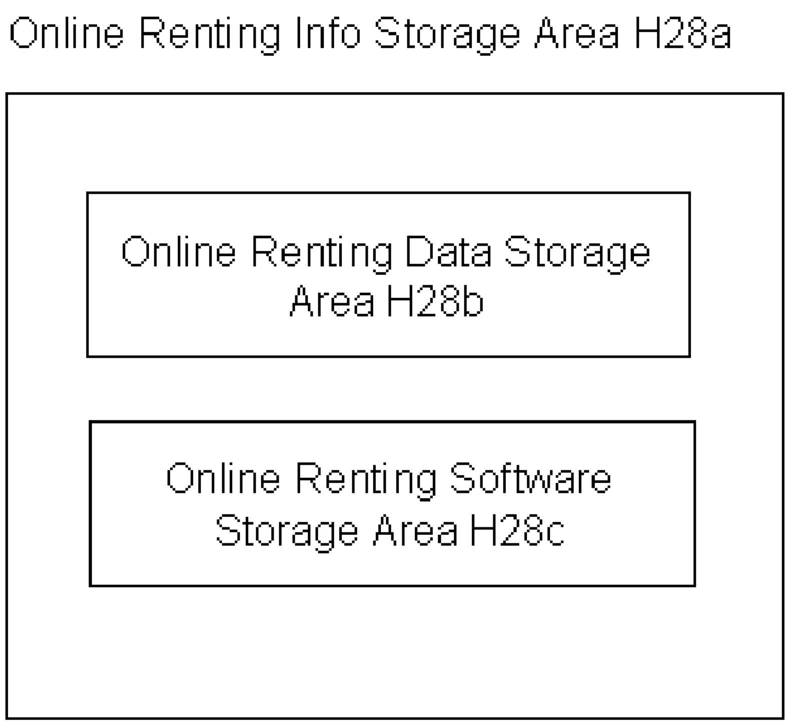

FIG. 581 is a block diagram illustrating an exemplary embodiment of the present invention.

Figure 582:
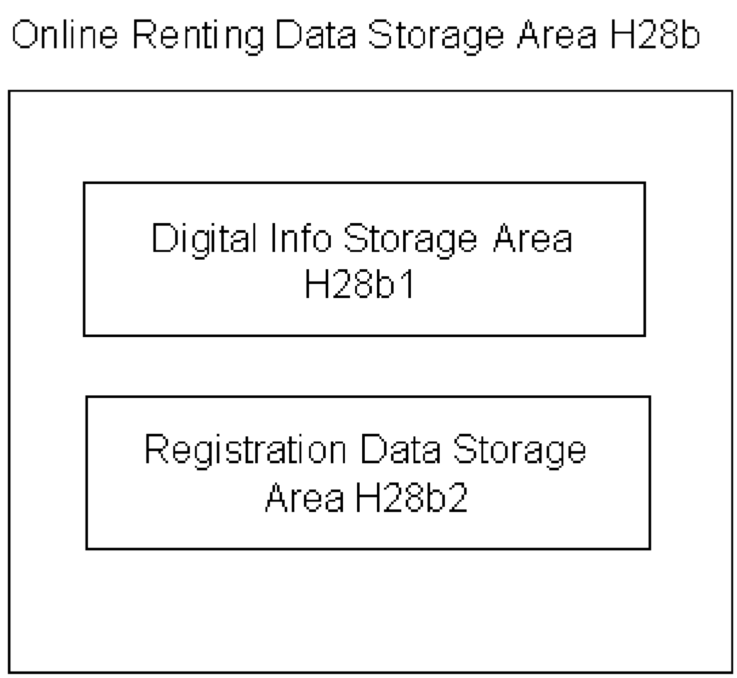

FIG. 582 is a block diagram illustrating an exemplary embodiment of the present invention.

Figure 583:
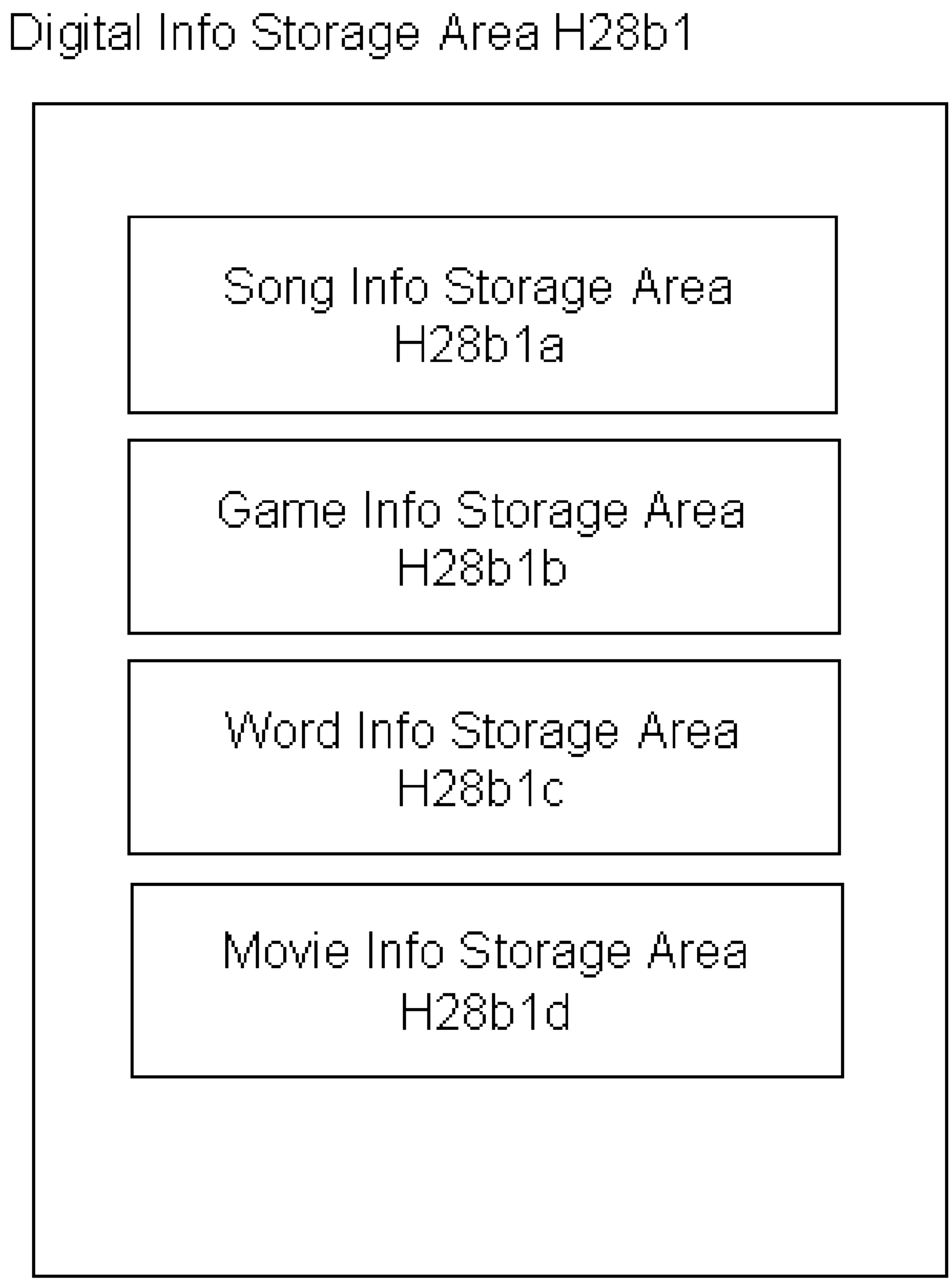

FIG. 583 is a block diagram illustrating an exemplary embodiment of the present invention.

Figure 584:
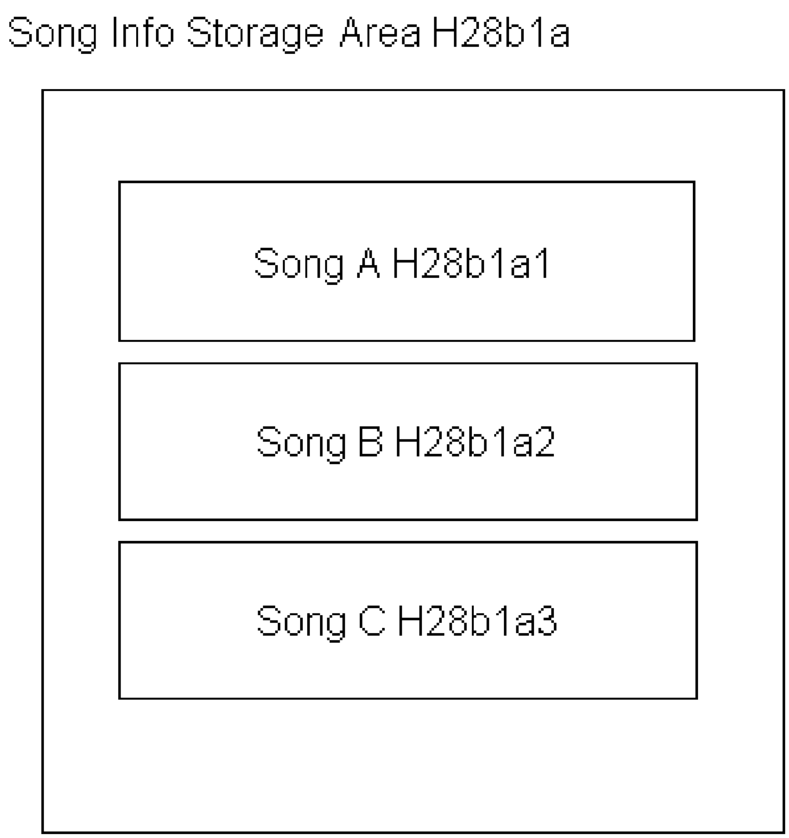

FIG. 584 is a block diagram illustrating an exemplary embodiment of the present invention.

Figure 585:
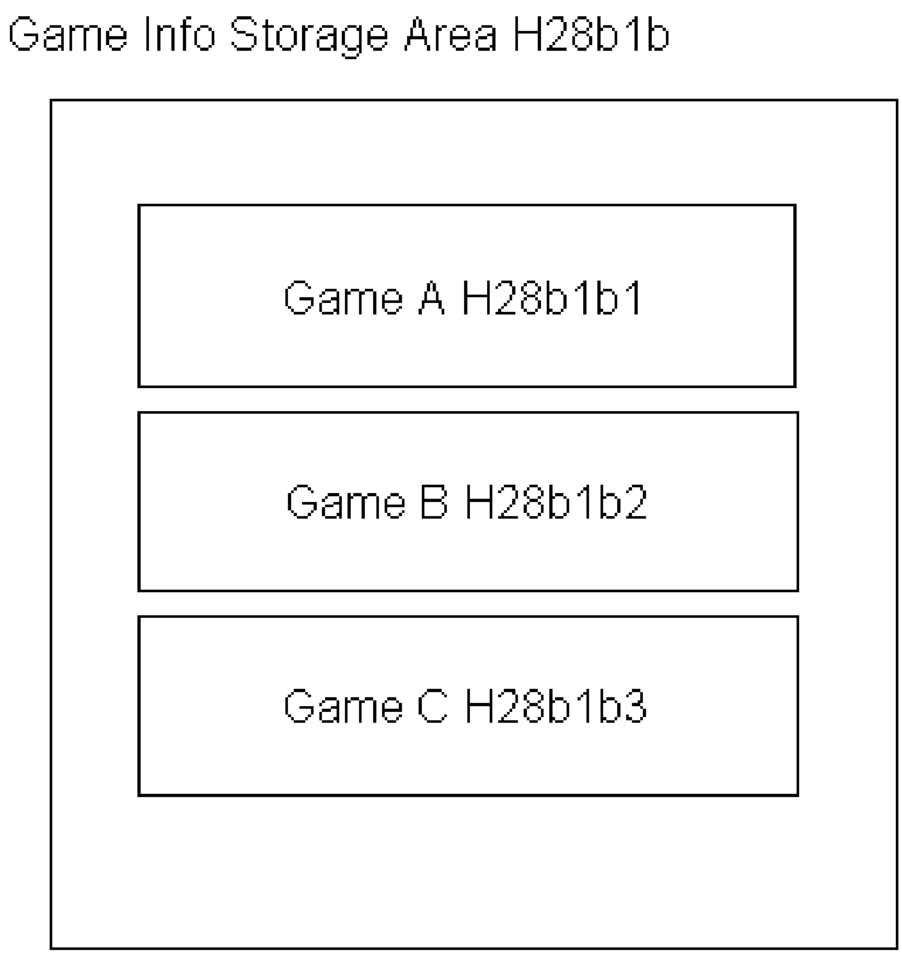

FIG. 585 is a block diagram illustrating an exemplary embodiment of the present invention.

Figure 586:
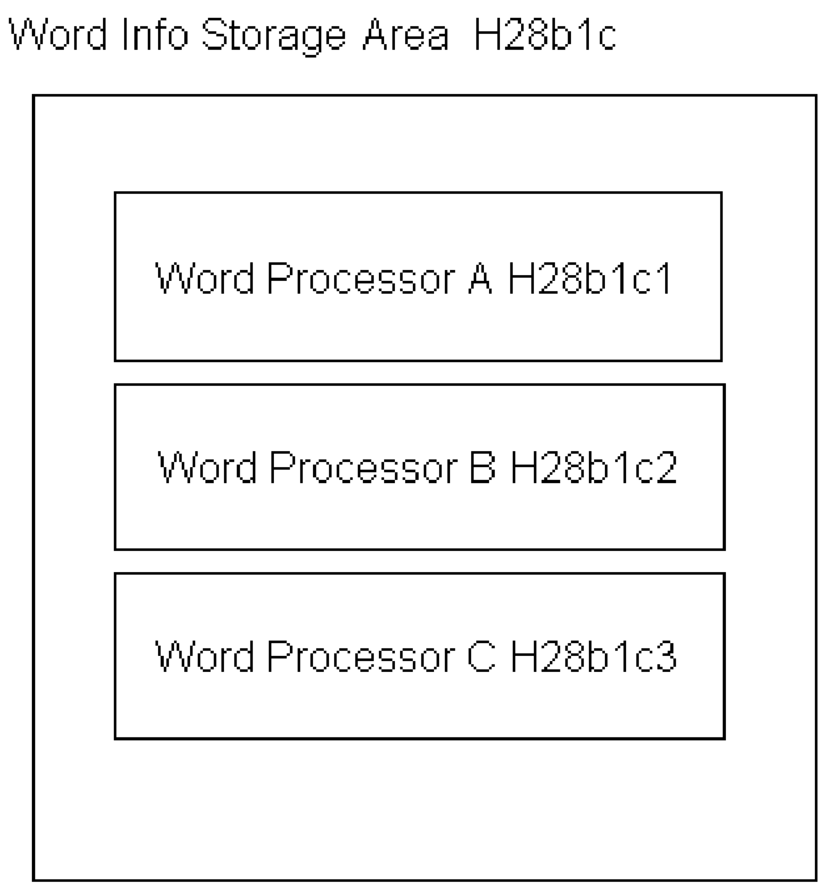

FIG. 586 is a block diagram illustrating an exemplary embodiment of the present invention.

Figure 587:
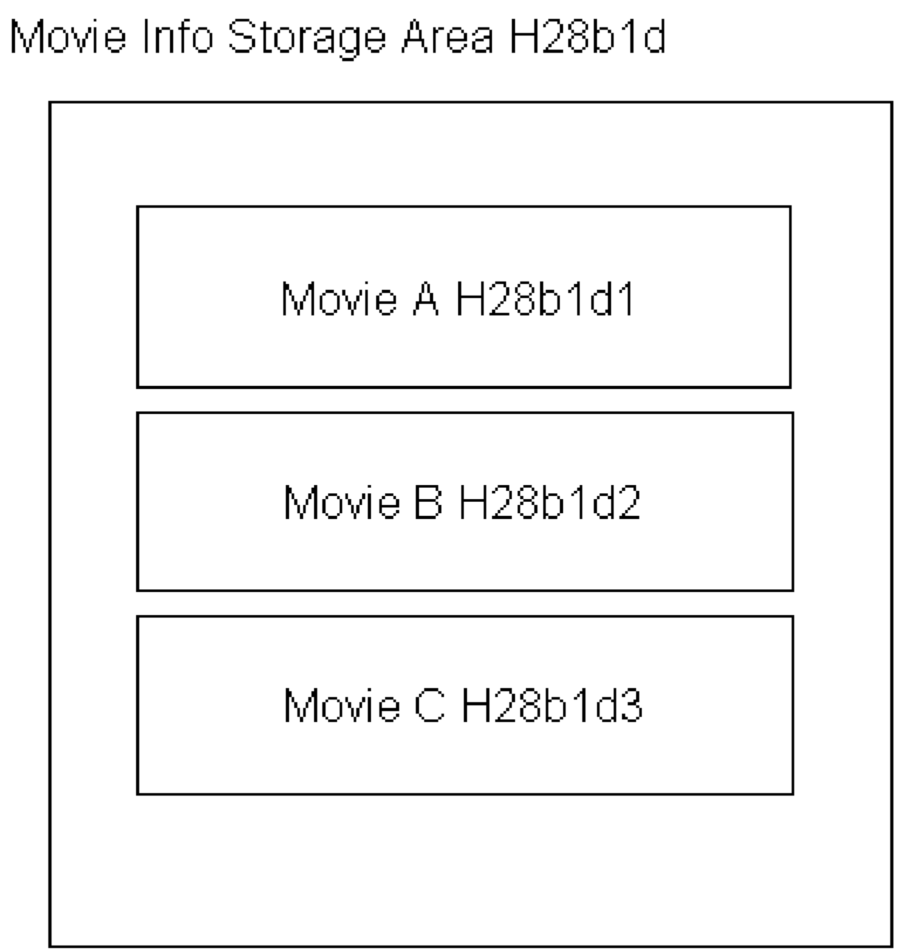

FIG. 587 is a block diagram illustrating an exemplary embodiment of the present invention.

FIG. 588 is a block diagram illustrating an exemplary embodiment of the present invention.

Figure 589:
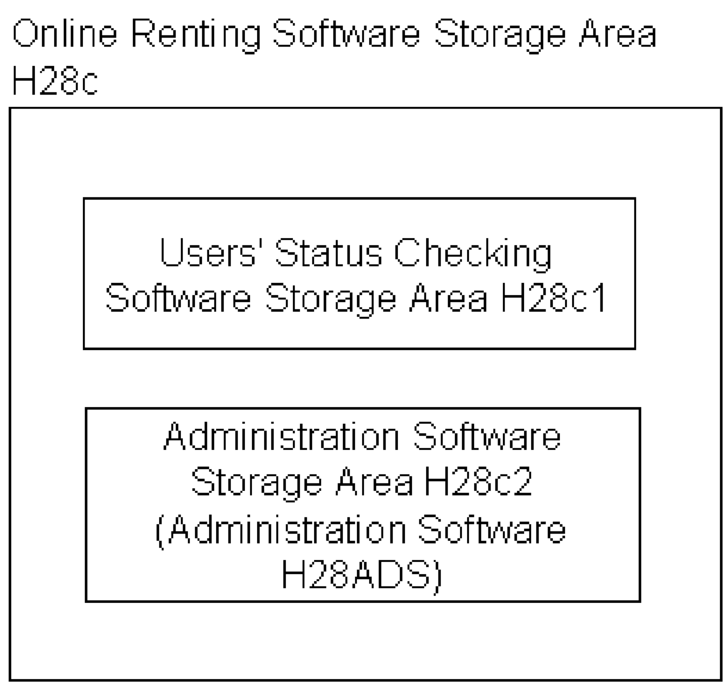

FIG. 589 is a block diagram illustrating an exemplary embodiment of the present invention.

Figure 590:
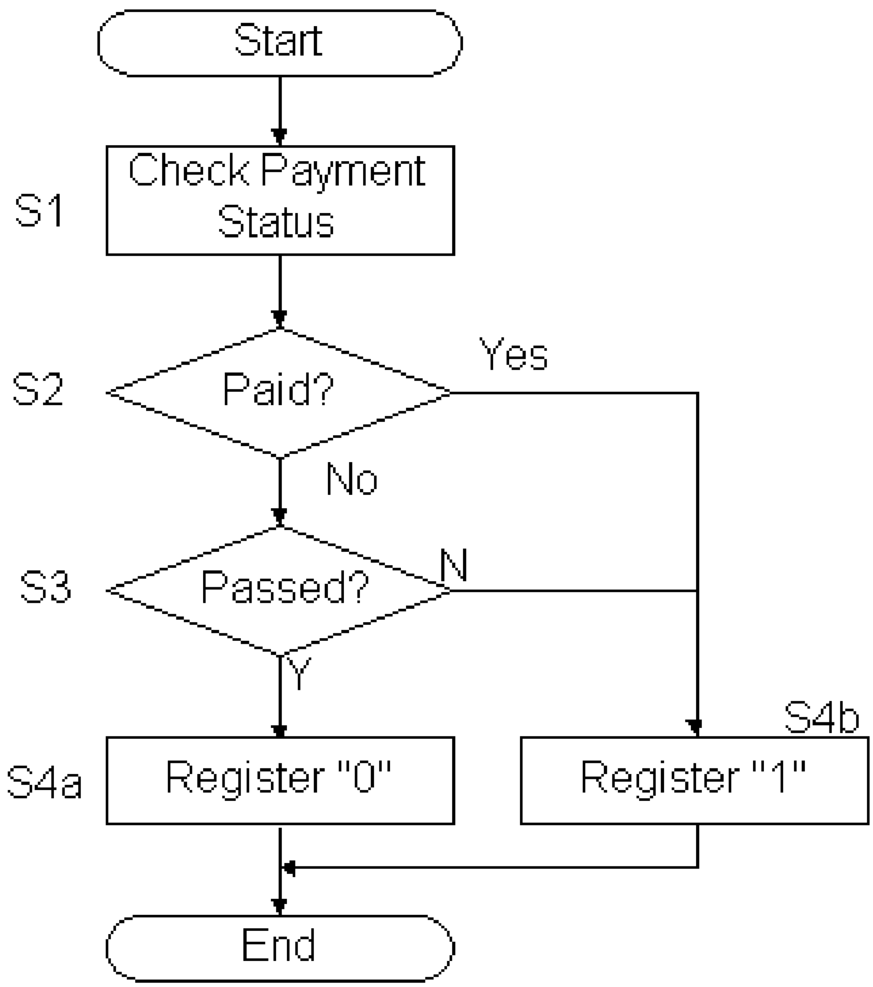

FIG. 590 is a block diagram illustrating an exemplary embodiment of the present invention.

Figure 591:
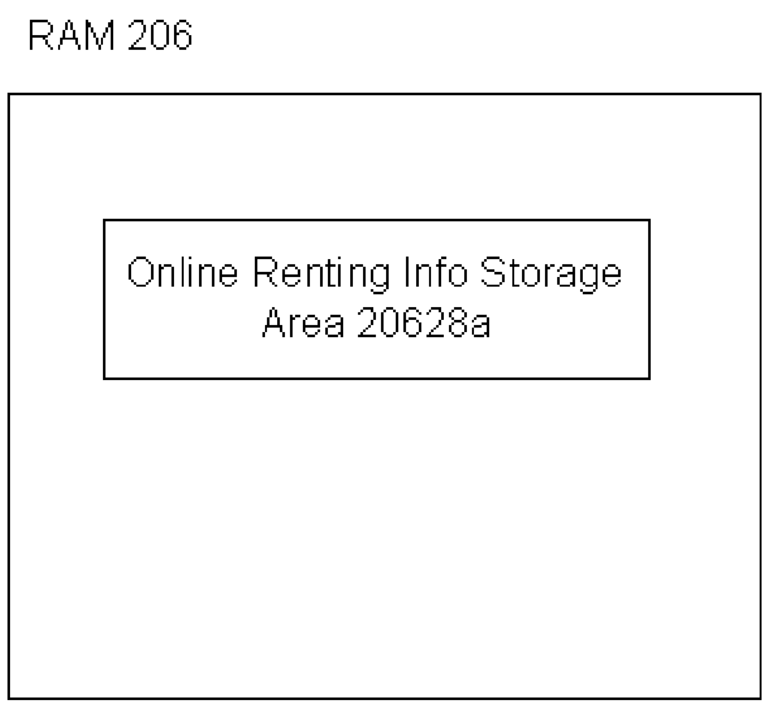

FIG. 591 is a block diagram illustrating an exemplary embodiment of the present invention.

Figure 592:
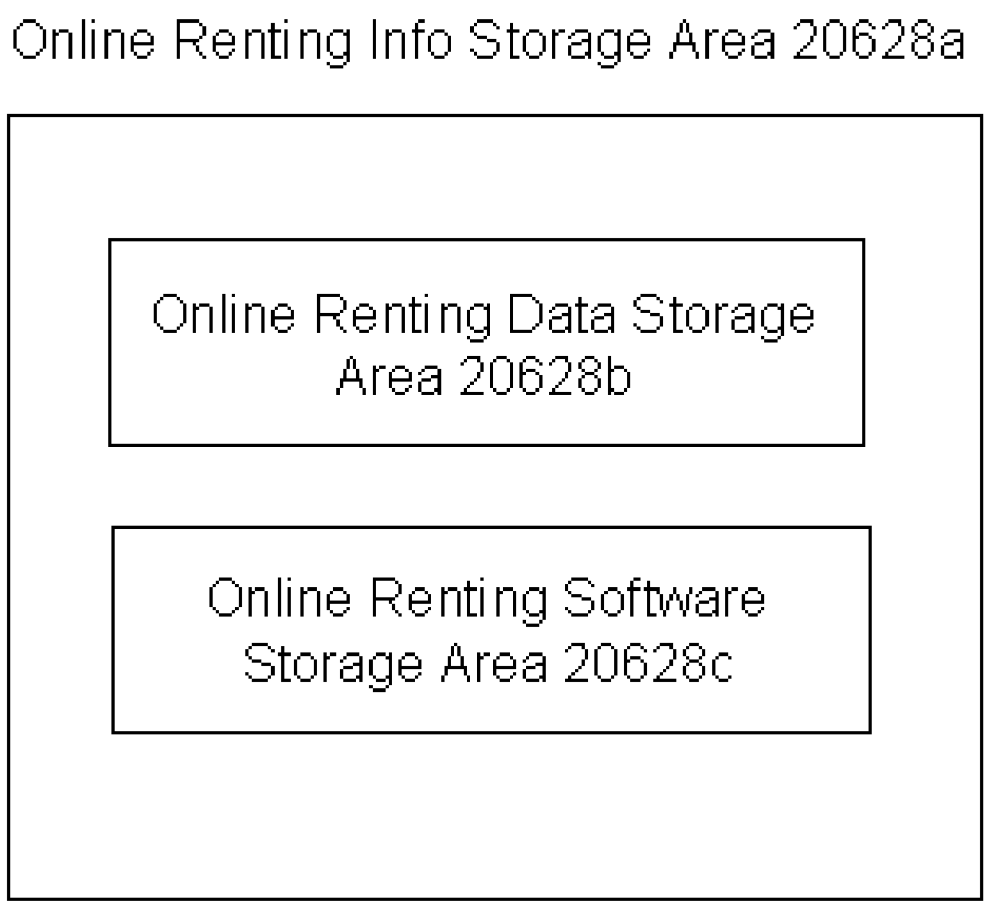

FIG. 592 is a block diagram illustrating an exemplary embodiment of the present invention.

Figure 593:
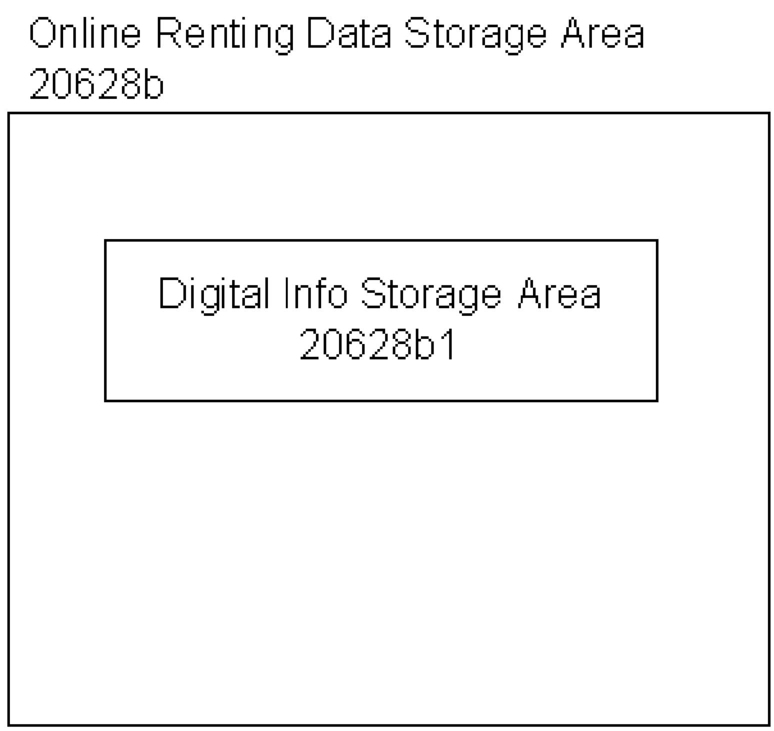

FIG. 593 is a block diagram illustrating an exemplary embodiment of the present invention.

Figure 594:
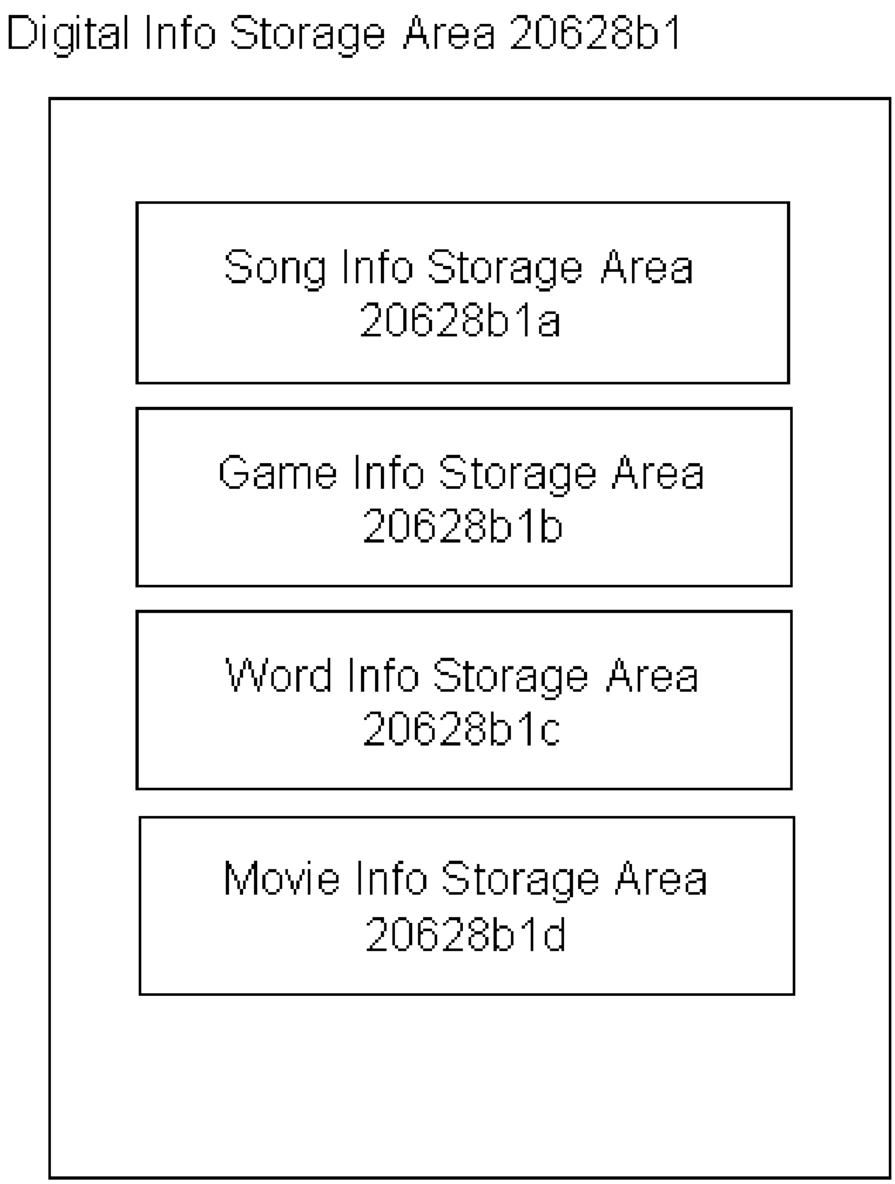

FIG. 594 is a block diagram illustrating an exemplary embodiment of the present invention.

Figure 595:
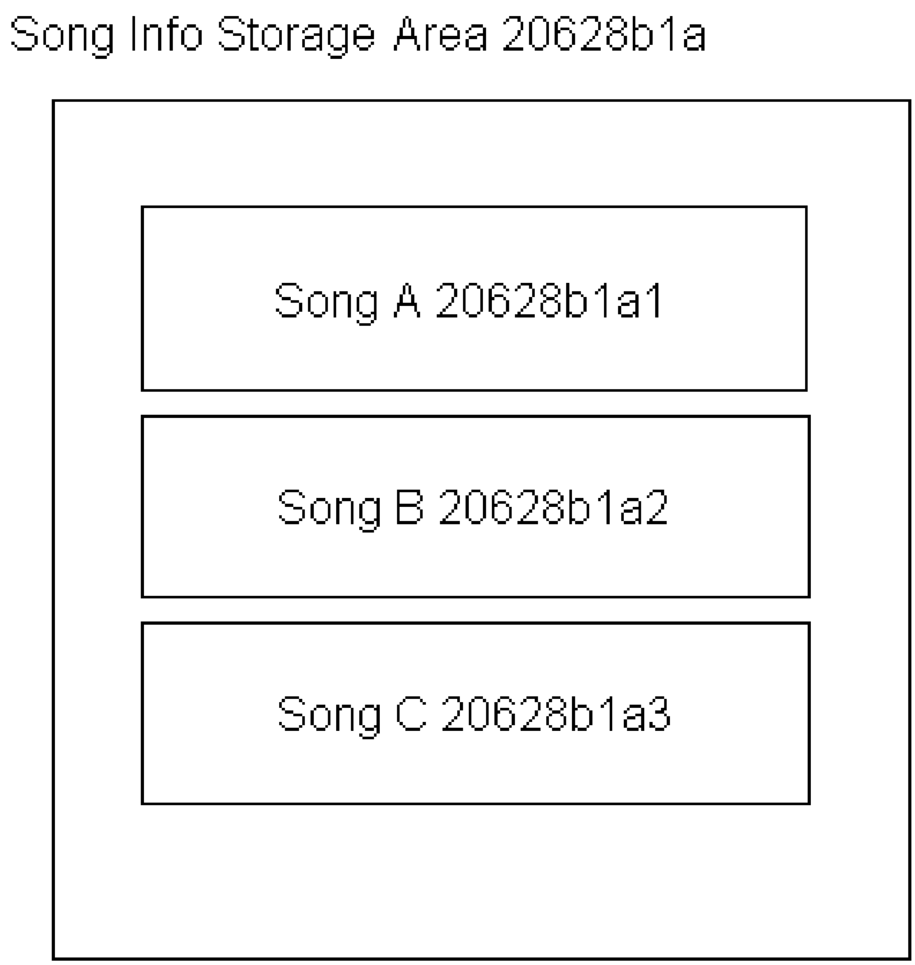

FIG. 595 is a block diagram illustrating an exemplary embodiment of the present invention.

Figure 596:
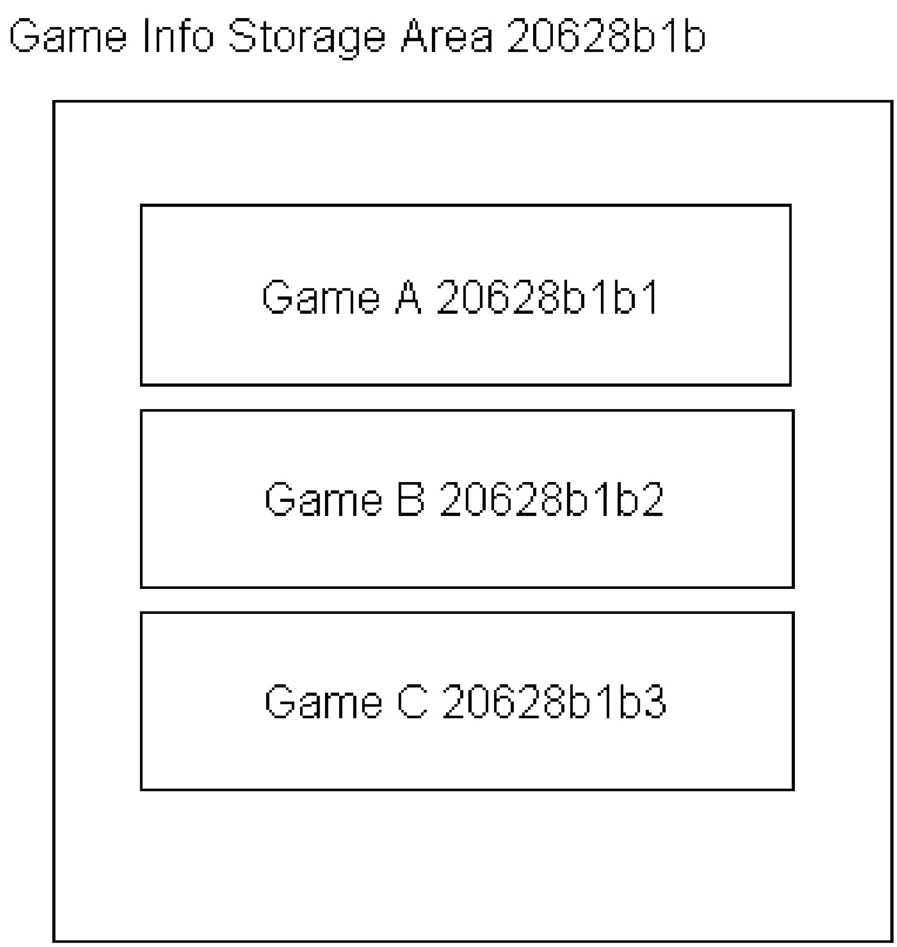

FIG. 596 is a block diagram illustrating an exemplary embodiment of the present invention.

Figure 597:
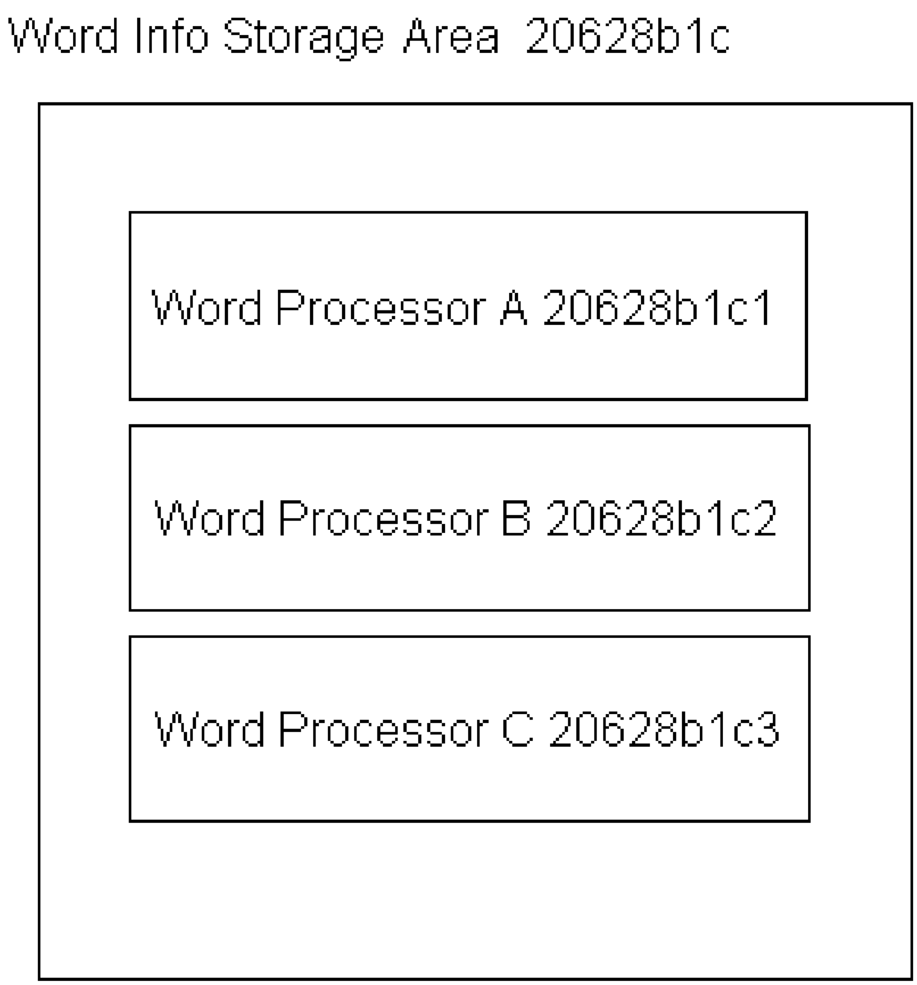

FIG. 597 is a block diagram illustrating an exemplary embodiment of the present invention.

Figure 598:
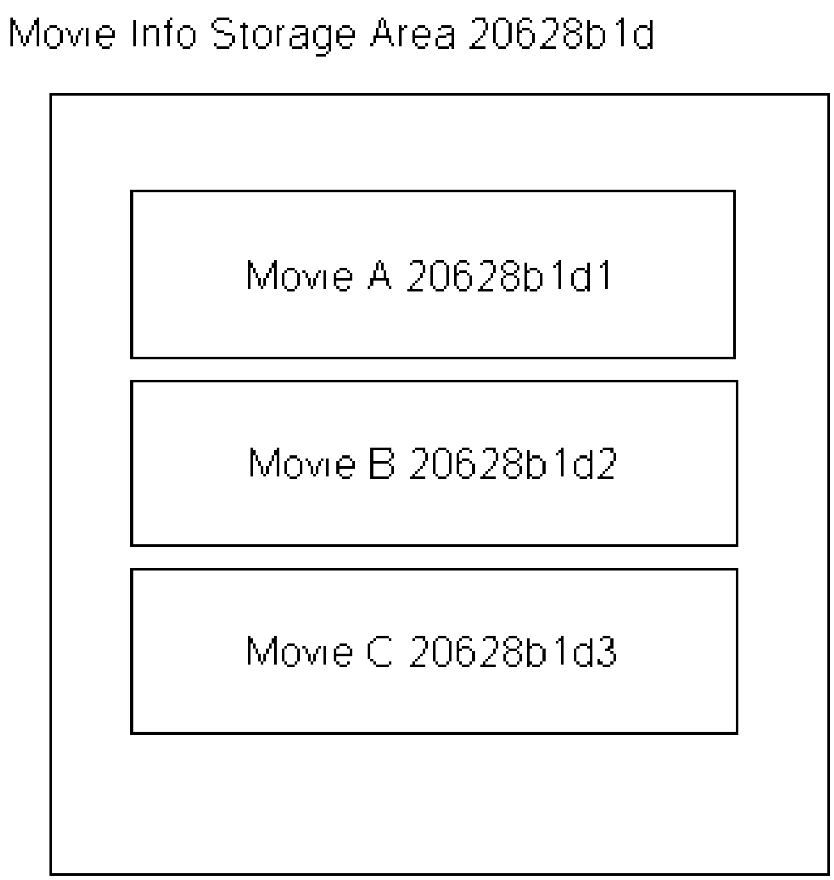

FIG. 598 is a block diagram illustrating an exemplary embodiment of the present invention.

Figure 599:
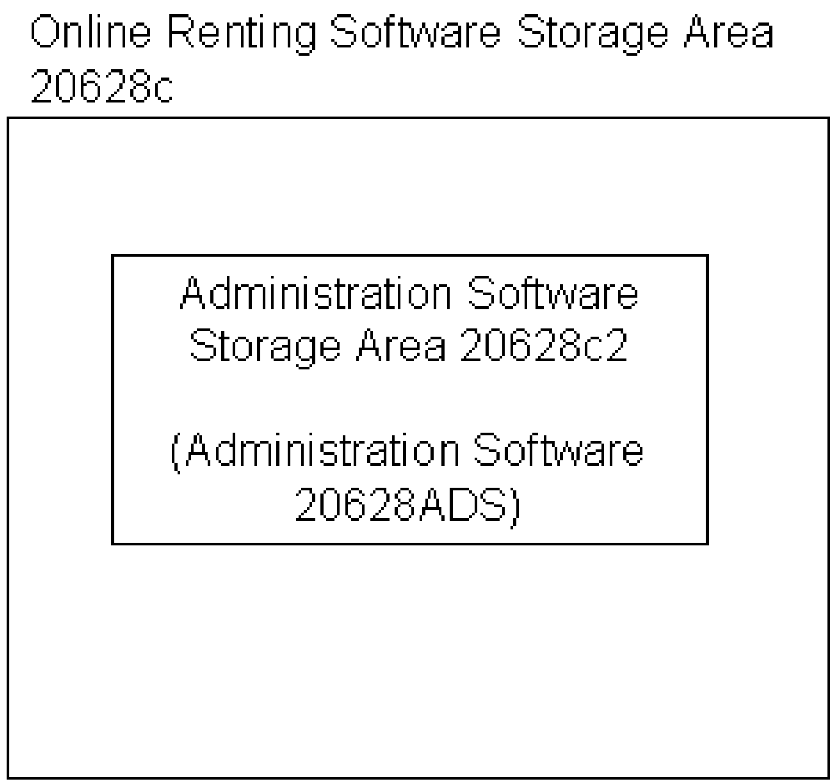

FIG. 599 is a block diagram illustrating an exemplary embodiment of the present invention.

Figure 600:
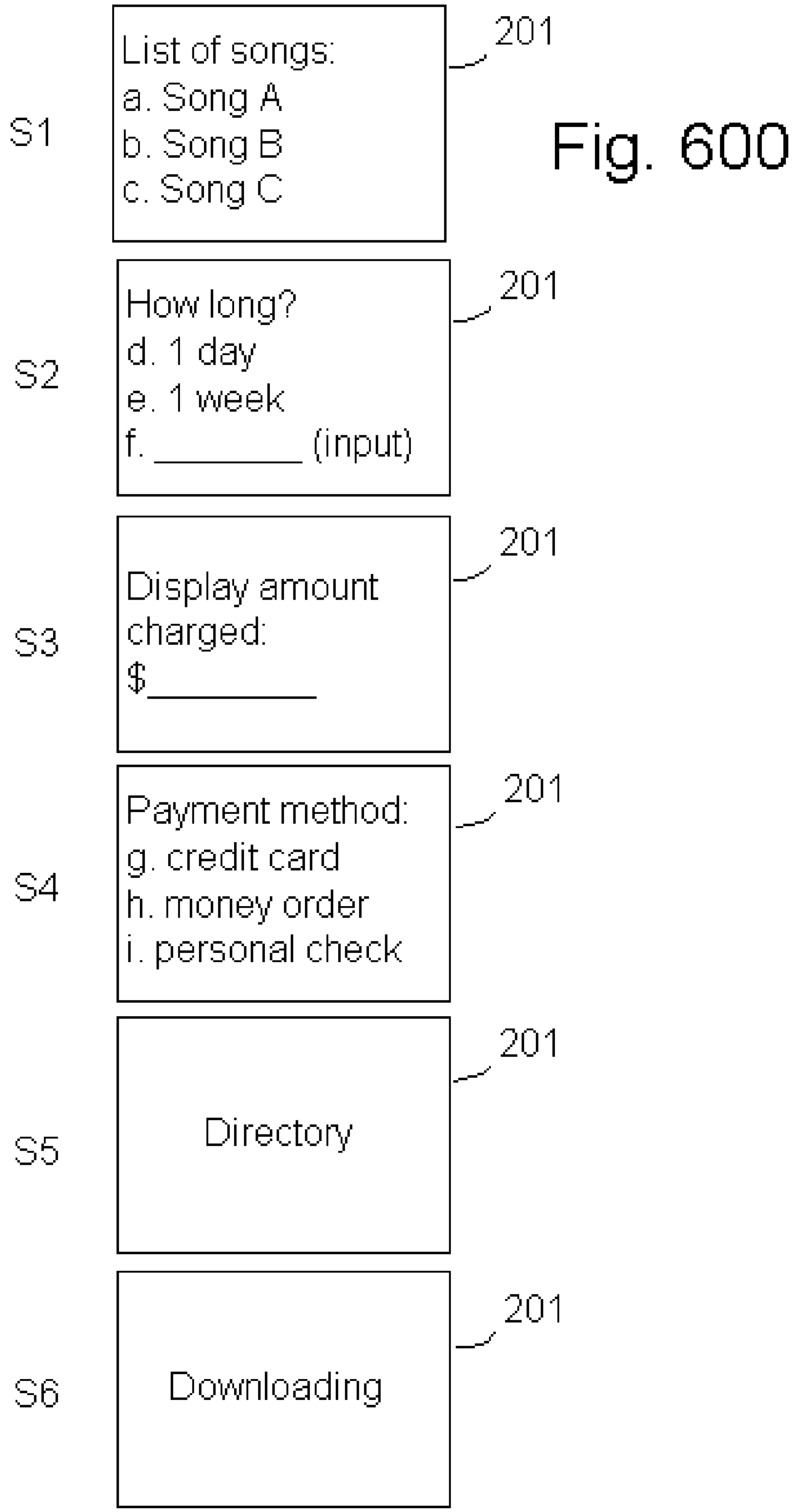

FIG. 600 is a simplified illustration illustrating an exemplary embodiment of the present invention.

Figure 601:
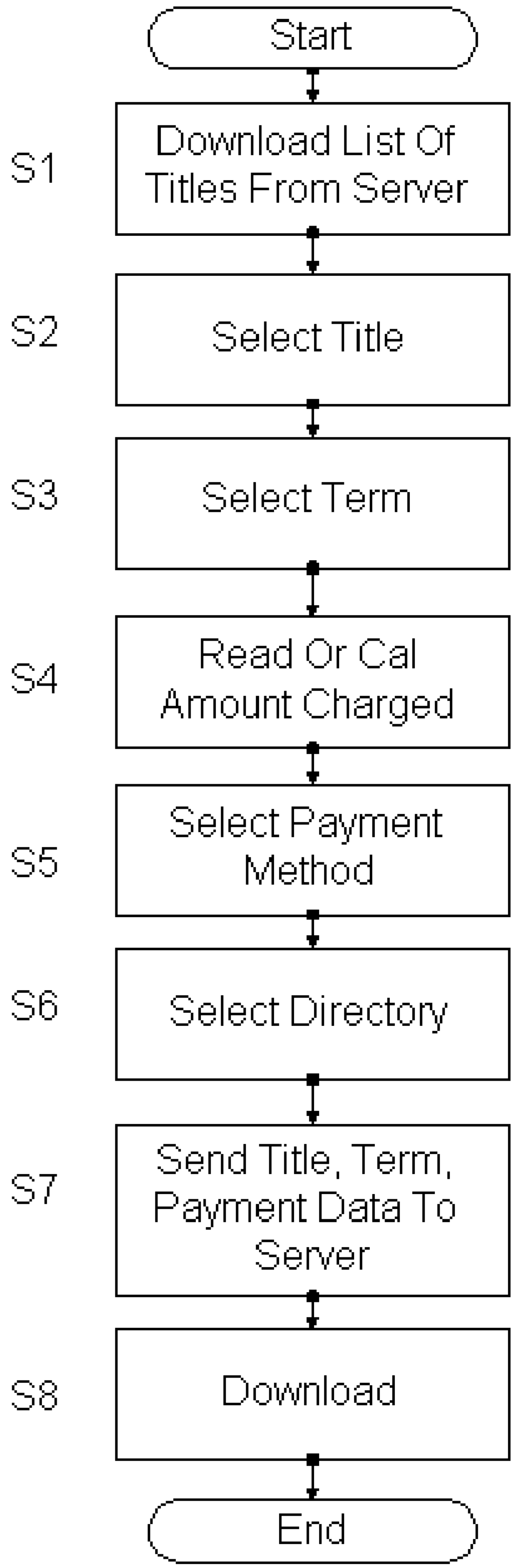

FIG. 601 is a flow chart illustrating an exemplary embodiment of the present invention.

Figure 601A:
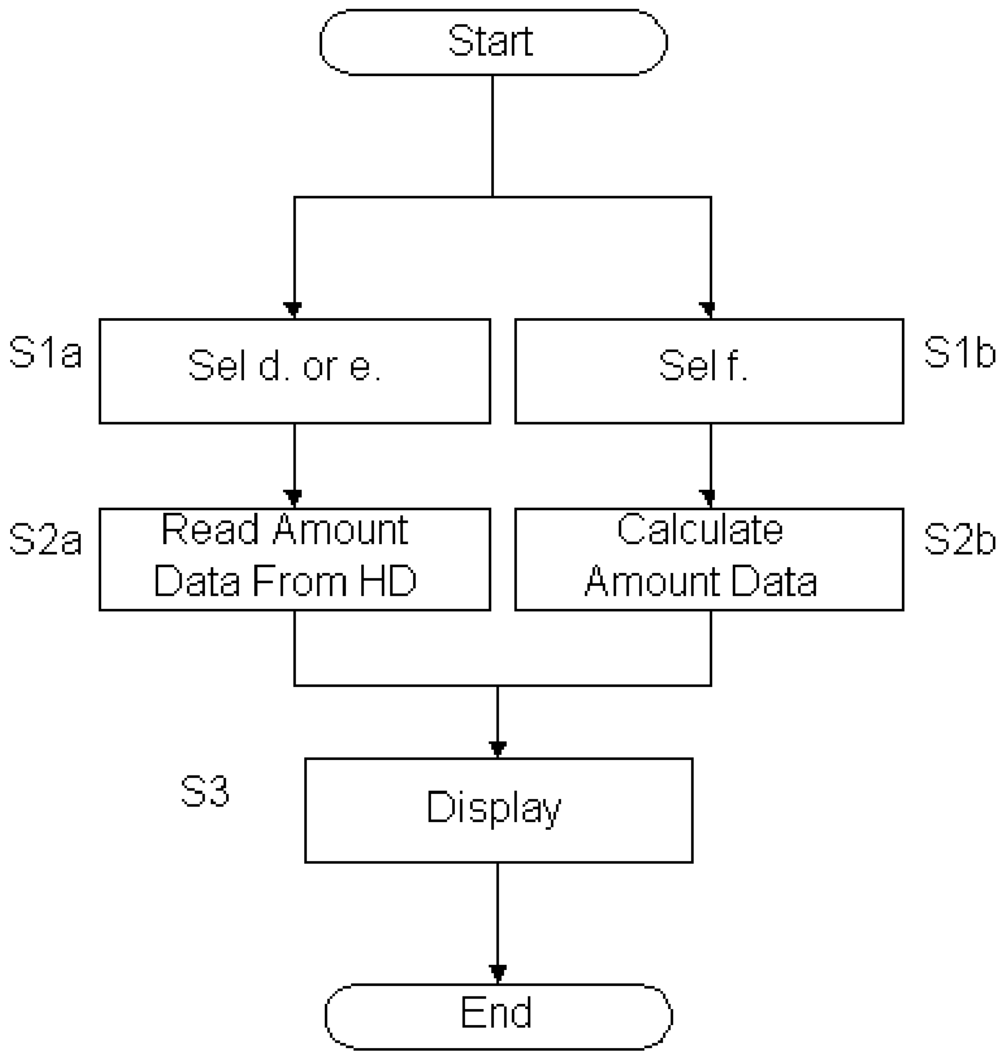

FIG. 601*a* is a flow chart illustrating an exemplary embodiment of the present invention.

Figure 602:
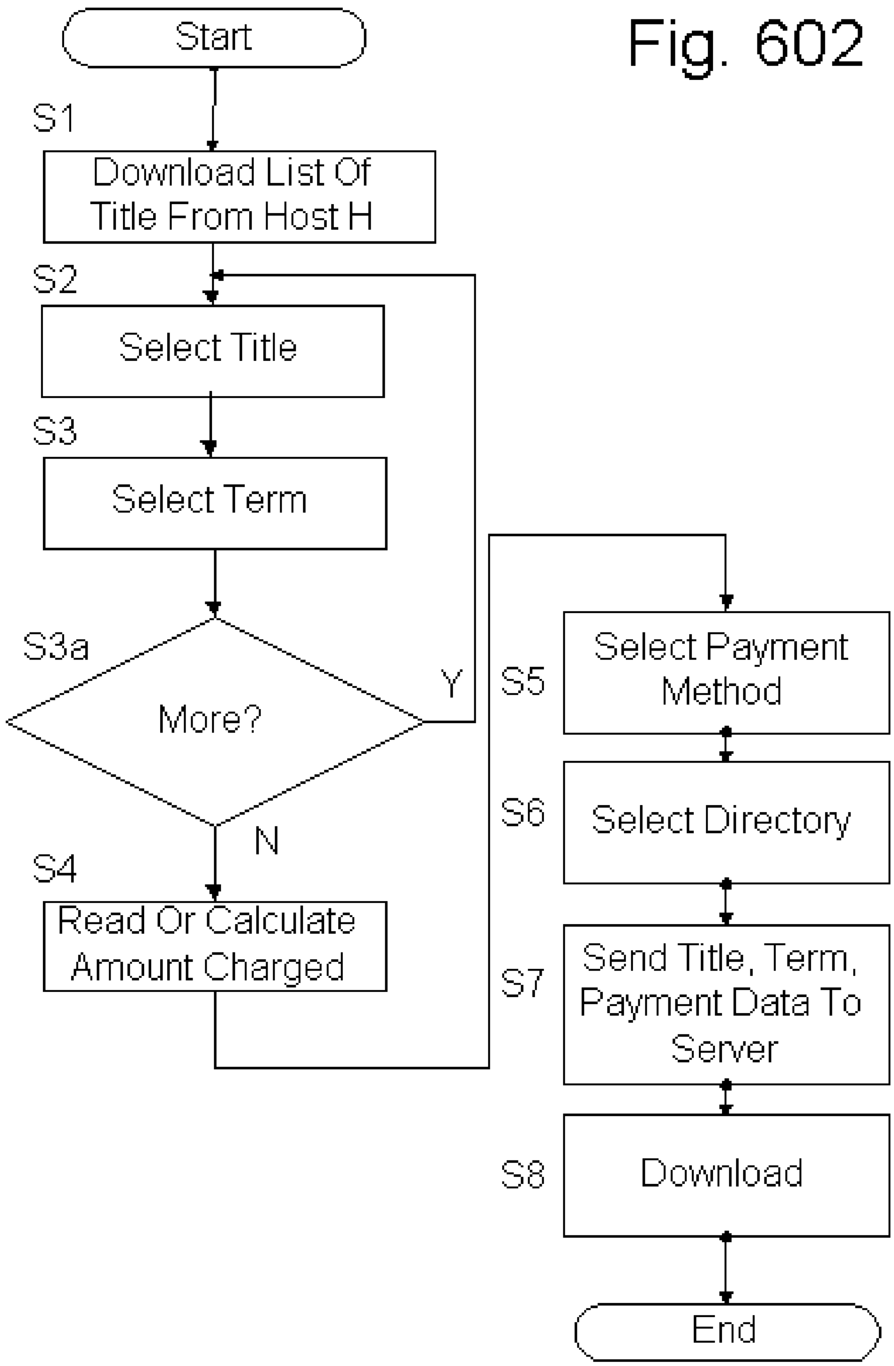

FIG. 602 is a flow chart illustrating an exemplary embodiment of the present invention.

Figure 603:
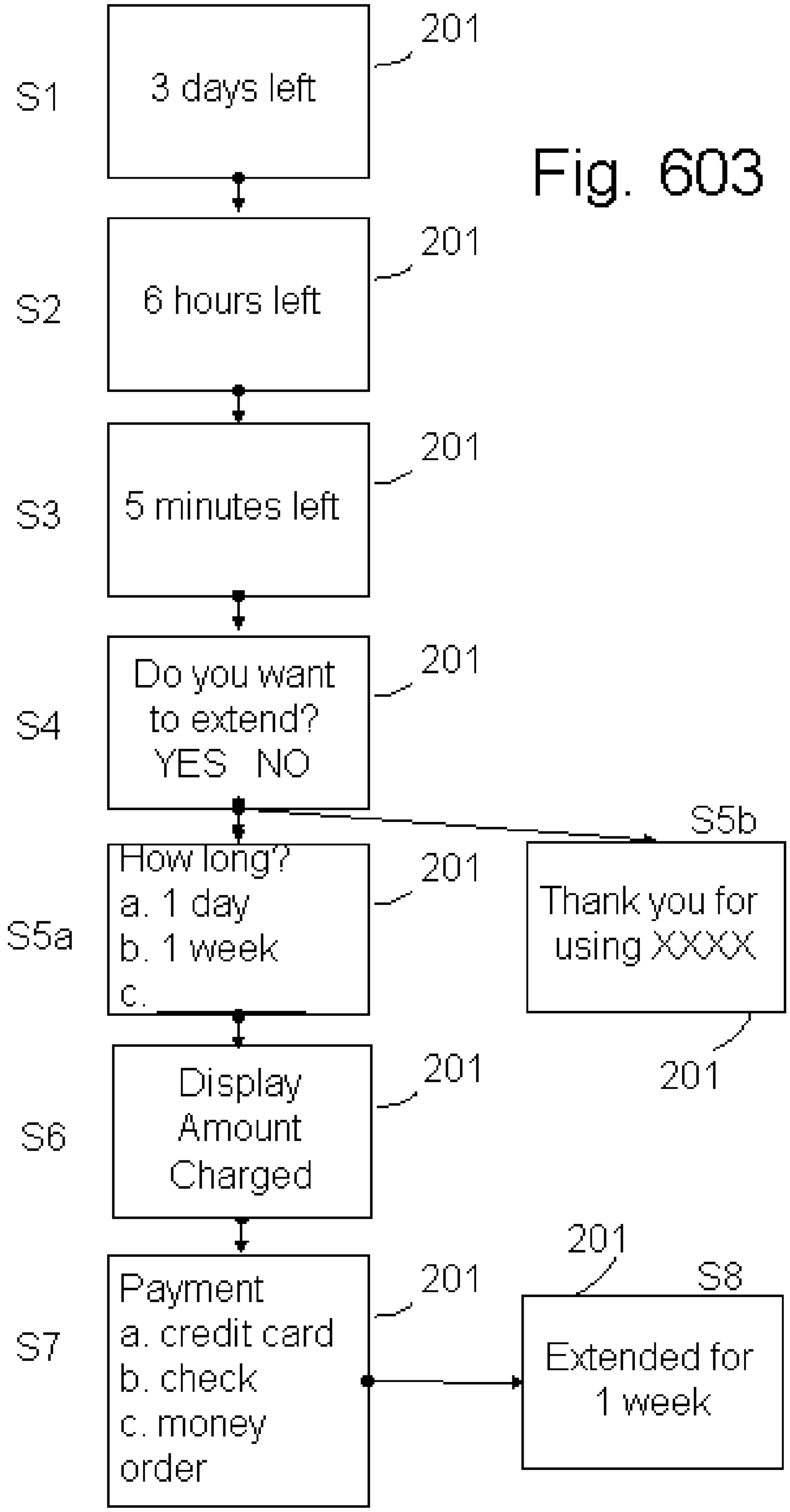

FIG. 603 is a simplified illustration illustrating an exemplary embodiment of the present invention.

Figure 604:
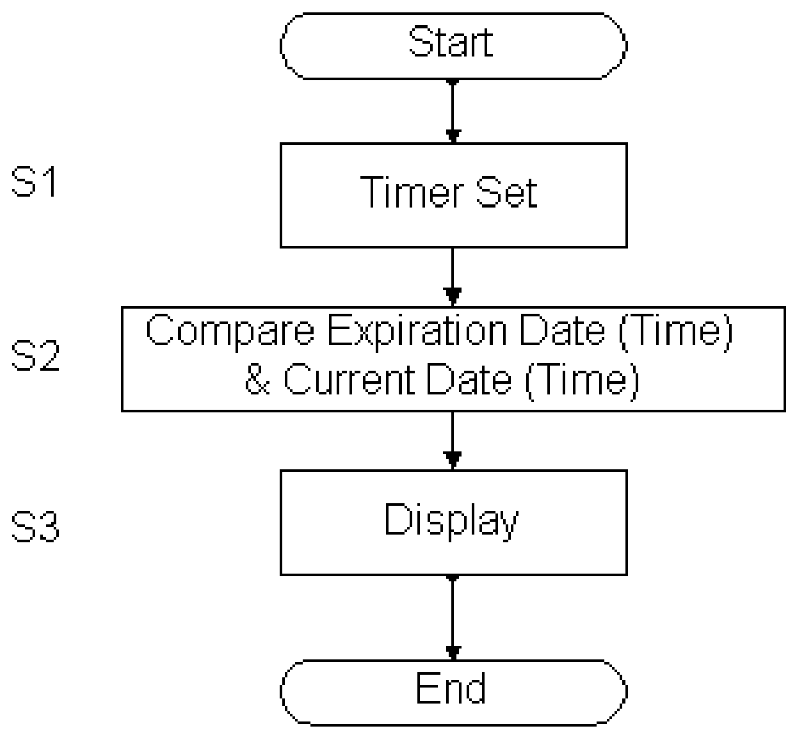

FIG. 604 is a flow chart illustrating an exemplary embodiment of the present invention.

Figure 605:
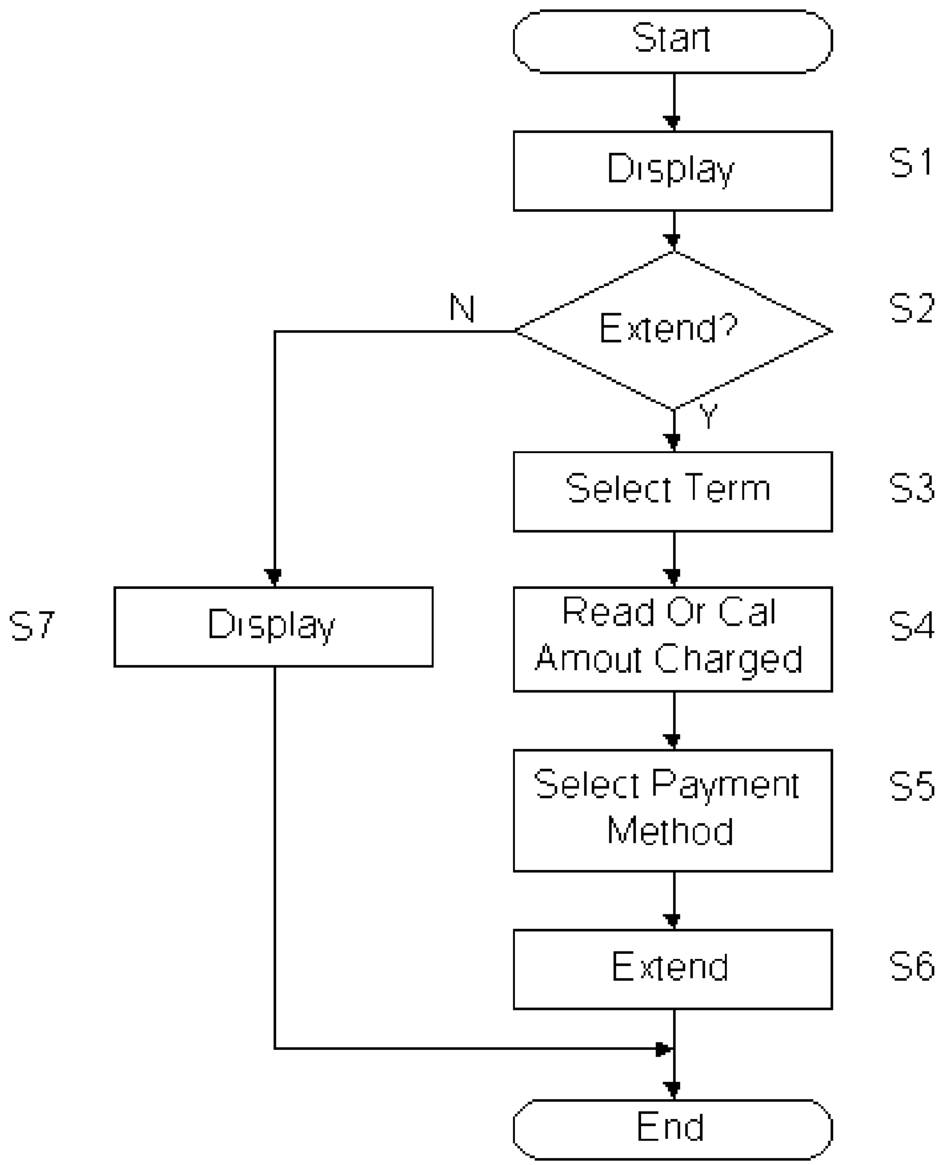

FIG. 605 is a flow chart illustrating an exemplary embodiment of the present invention.

Figure 606:
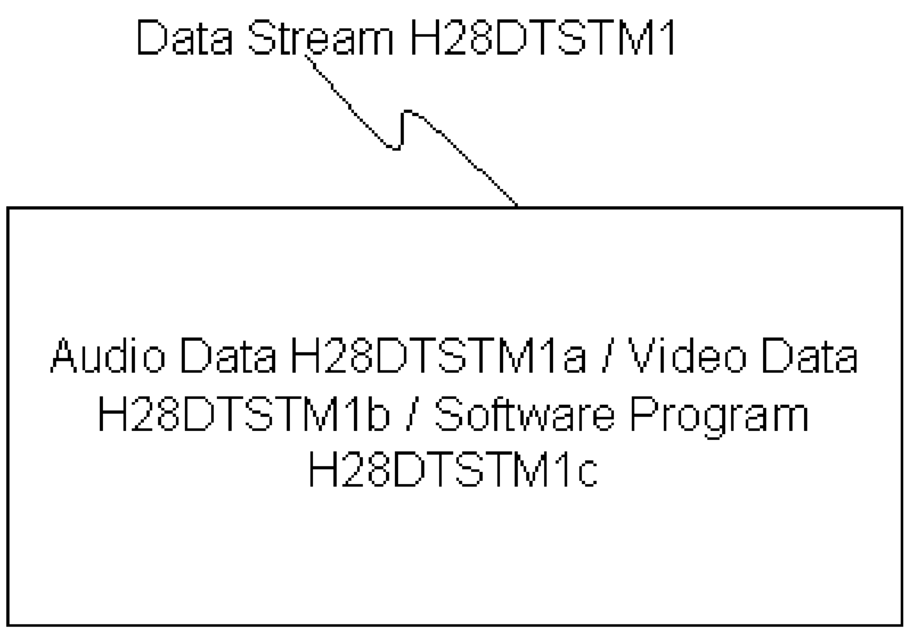

FIG. 606 is a block diagram illustrating an exemplary embodiment of the present invention.

Figure 607:
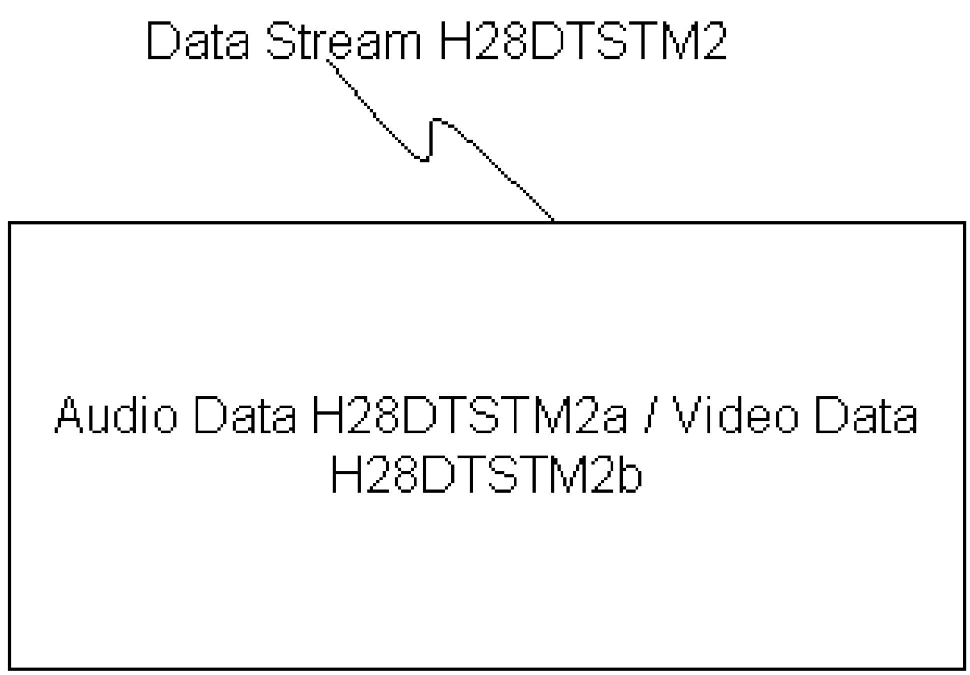

FIG. 607 is a block diagram illustrating an exemplary embodiment of the present invention.

Figure 608:
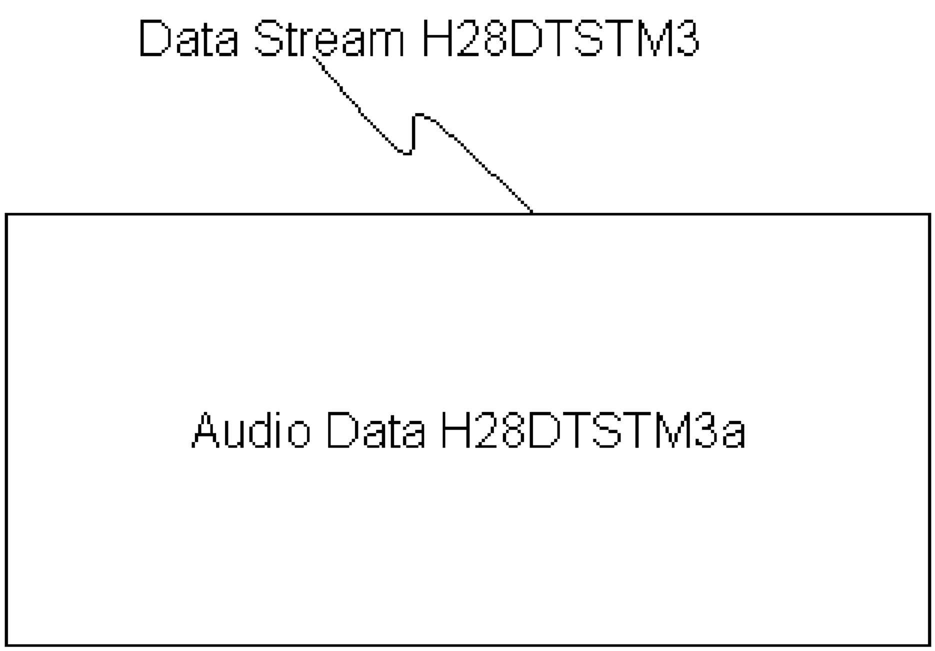

FIG. 608 is a block diagram illustrating an exemplary embodiment of the present invention.

Figure 609:
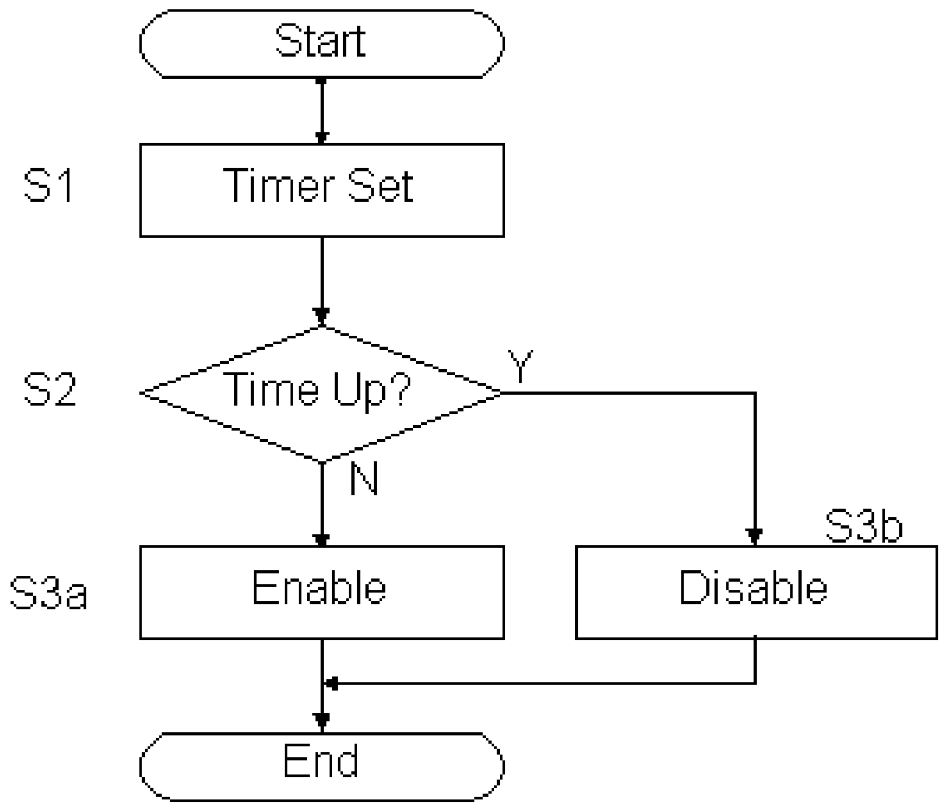

FIG. 609 is a flow chart illustrating an exemplary embodiment of the present invention.

Figure 610:
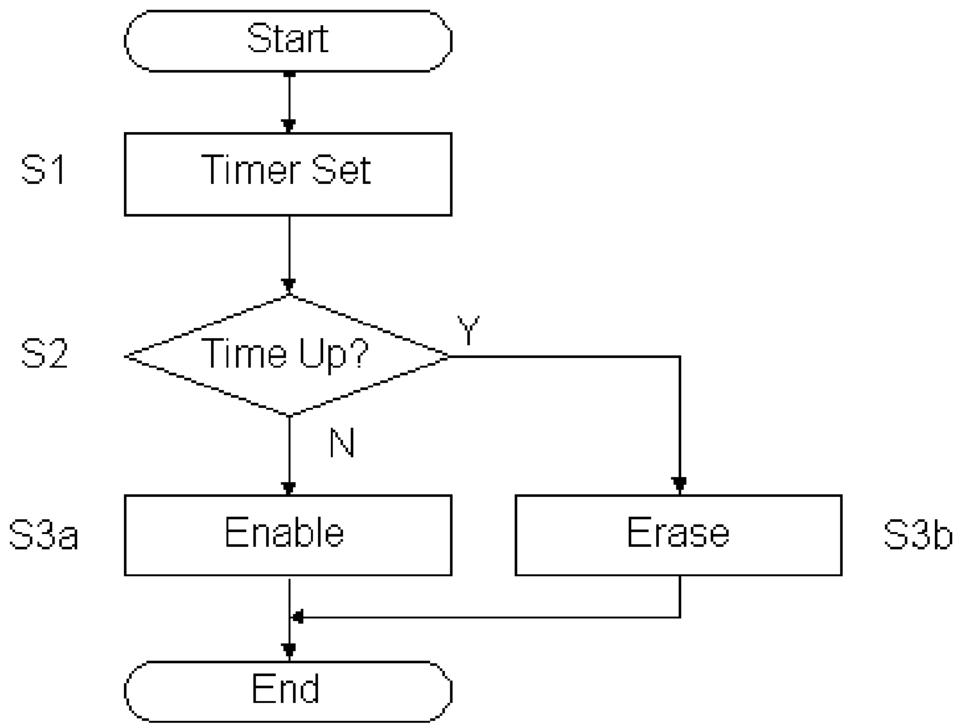

FIG. 610 is a flow chart illustrating an exemplary embodiment of the present invention.

Figure 611:
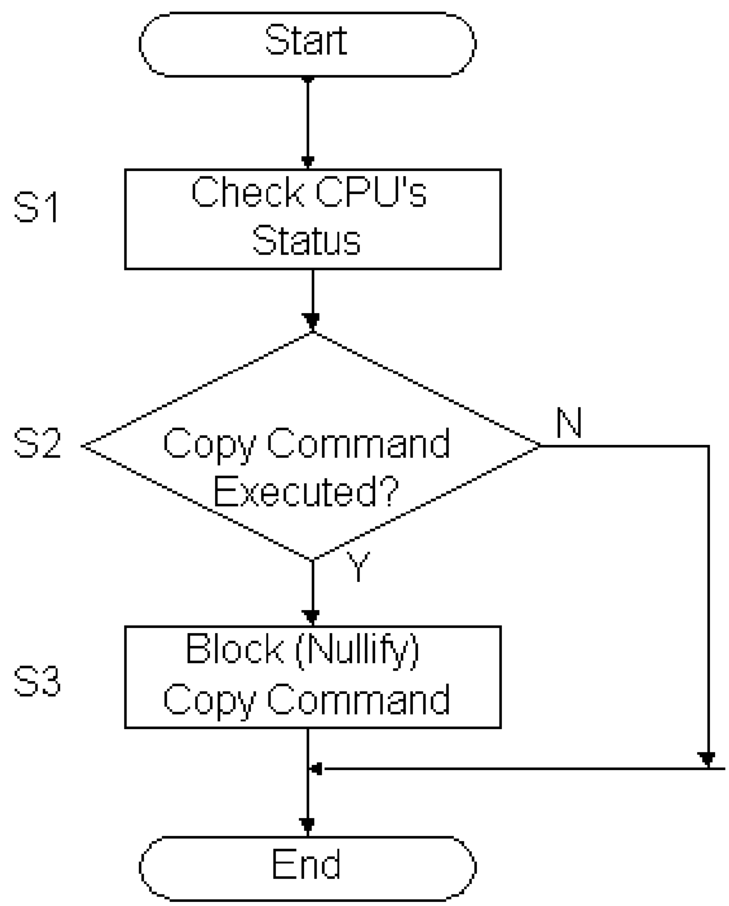

FIG. 611 is a flow chart illustrating an exemplary embodiment of the present invention.

Figure 612:
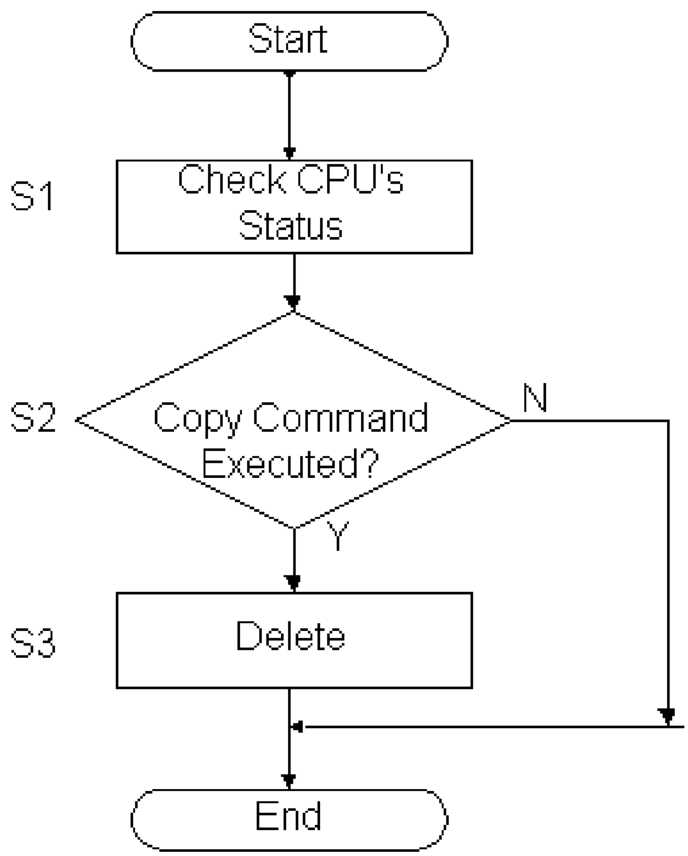

FIG. 612 is a flow chart illustrating an exemplary embodiment of the present invention.

Figure 613:
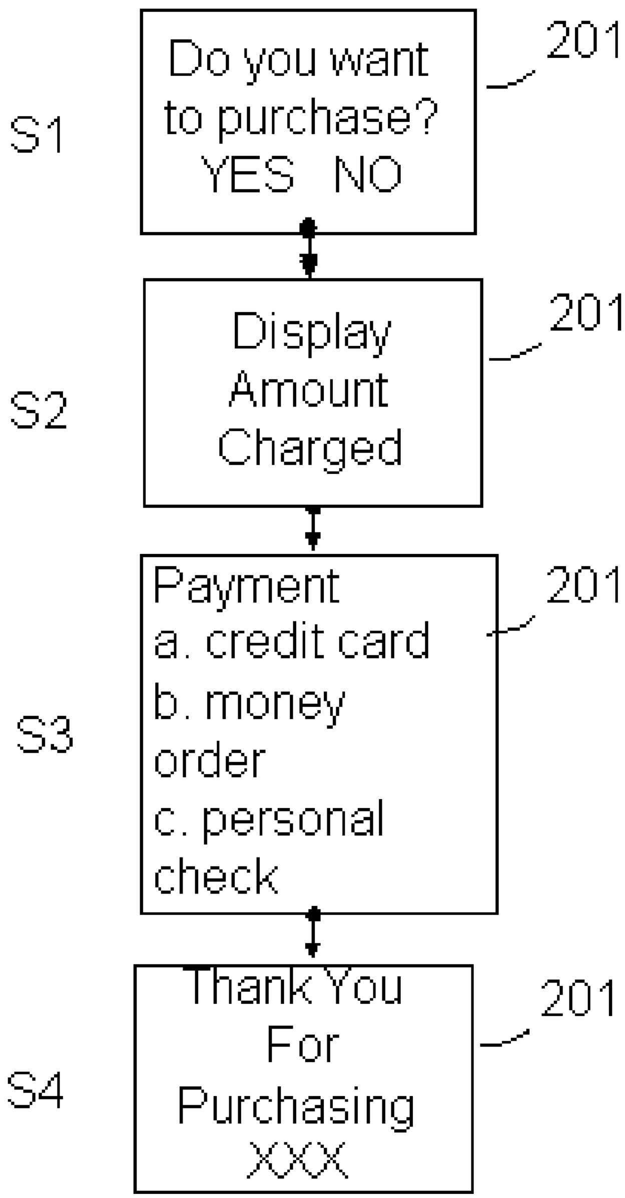

FIG. 613 is a simplified illustration illustrating an exemplary embodiment of the present invention.

Figure 614:
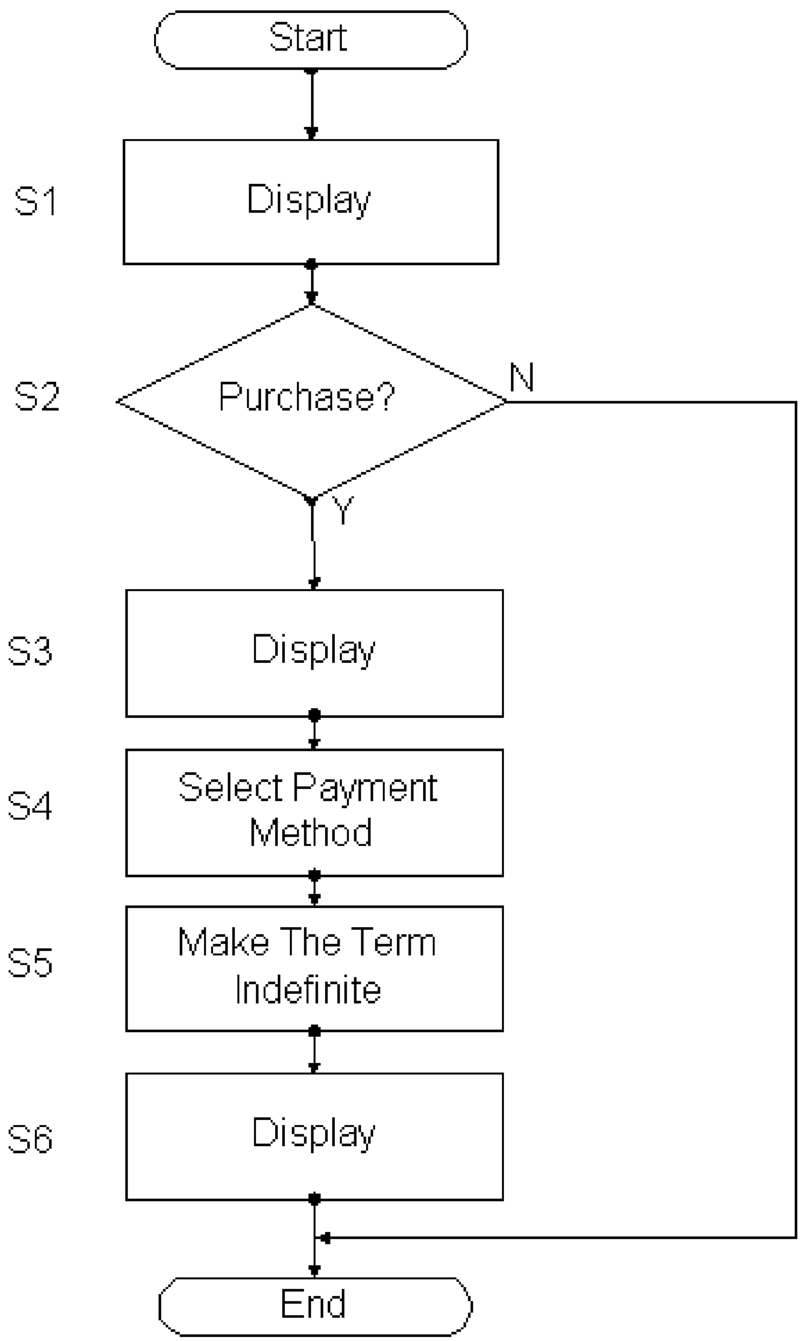

FIG. 614 is a flow chart illustrating an exemplary embodiment of the present invention.

Figure 615:
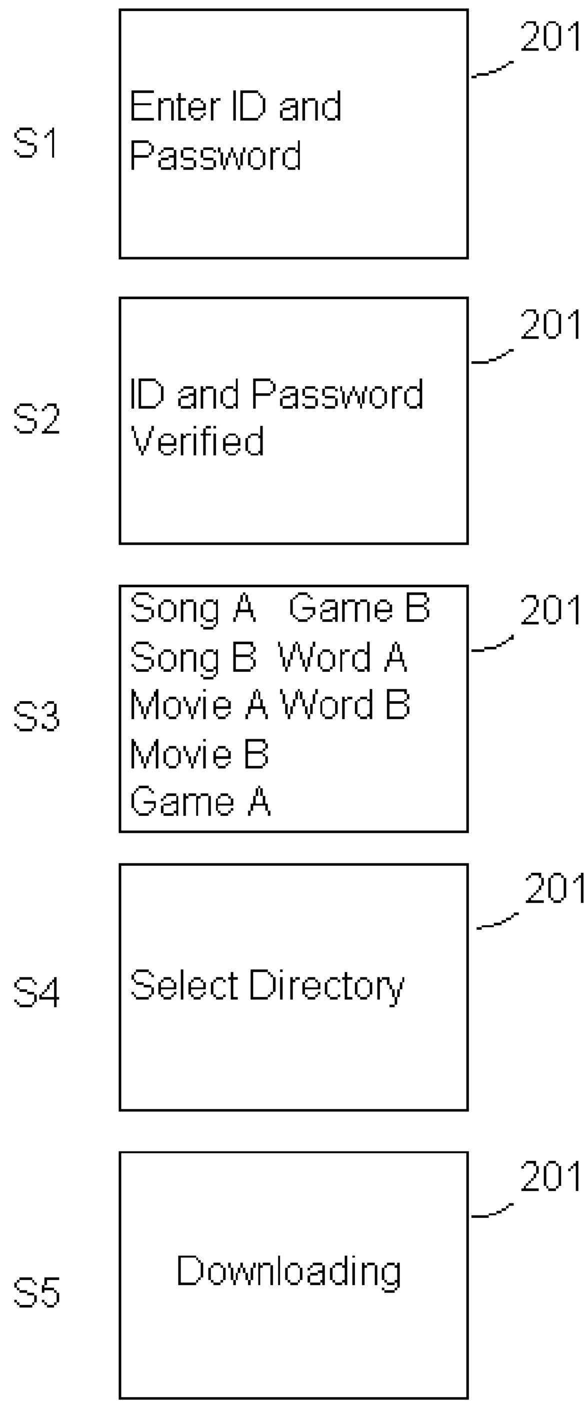

FIG. 615 is a simplified illustration illustrating an exemplary embodiment of the present invention.

Figure 616:
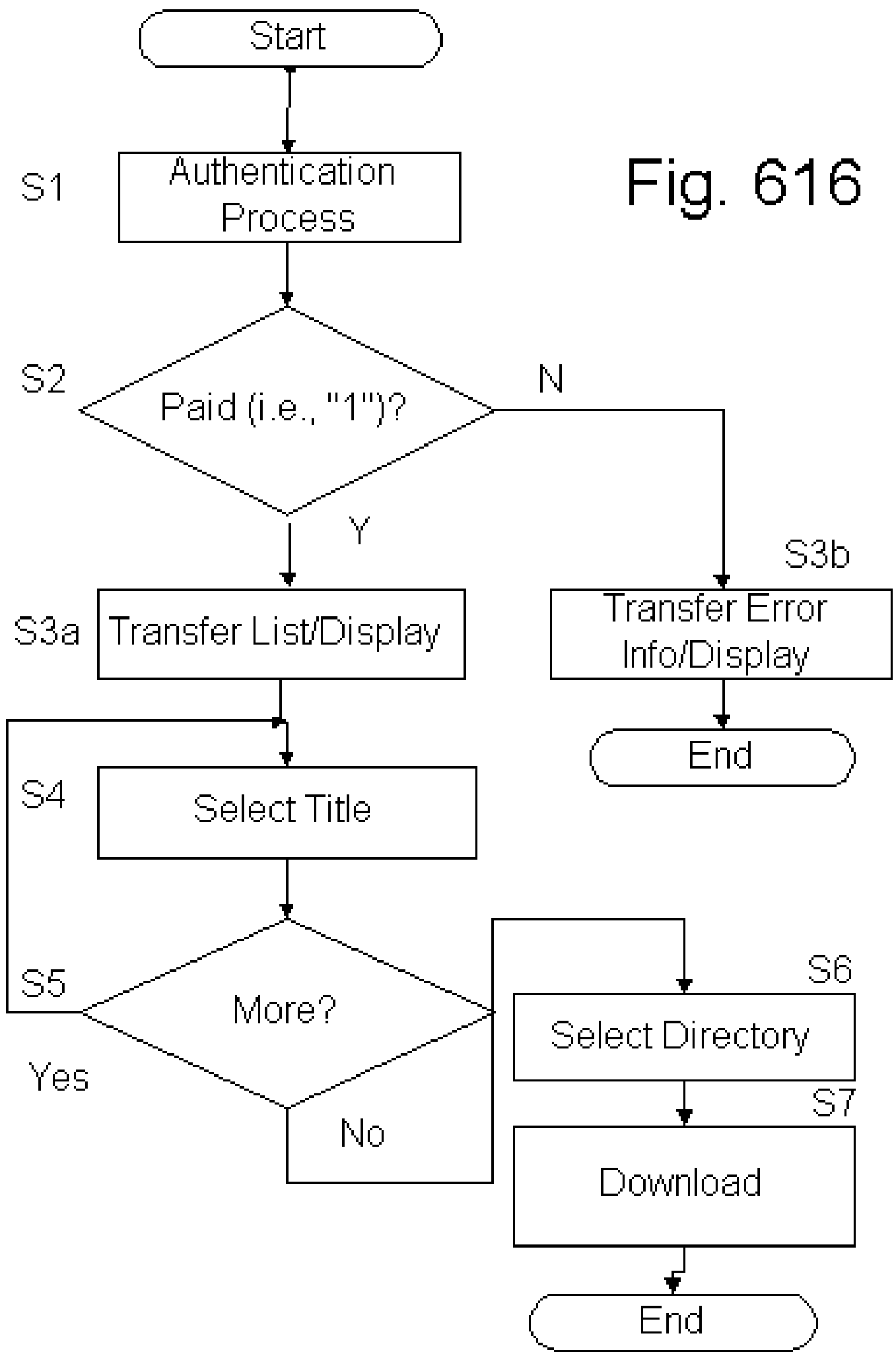

FIG. 616 is a flow chart illustrating an exemplary embodiment of the present invention.

Figure 617:
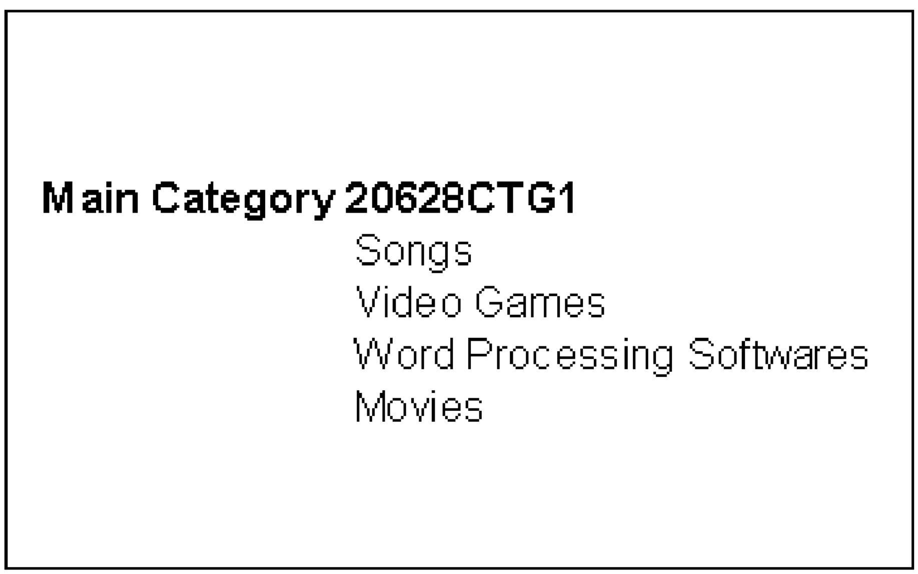

FIG. 617 is a simplified illustration illustrating an exemplary embodiment of the present invention.

Figure 618:
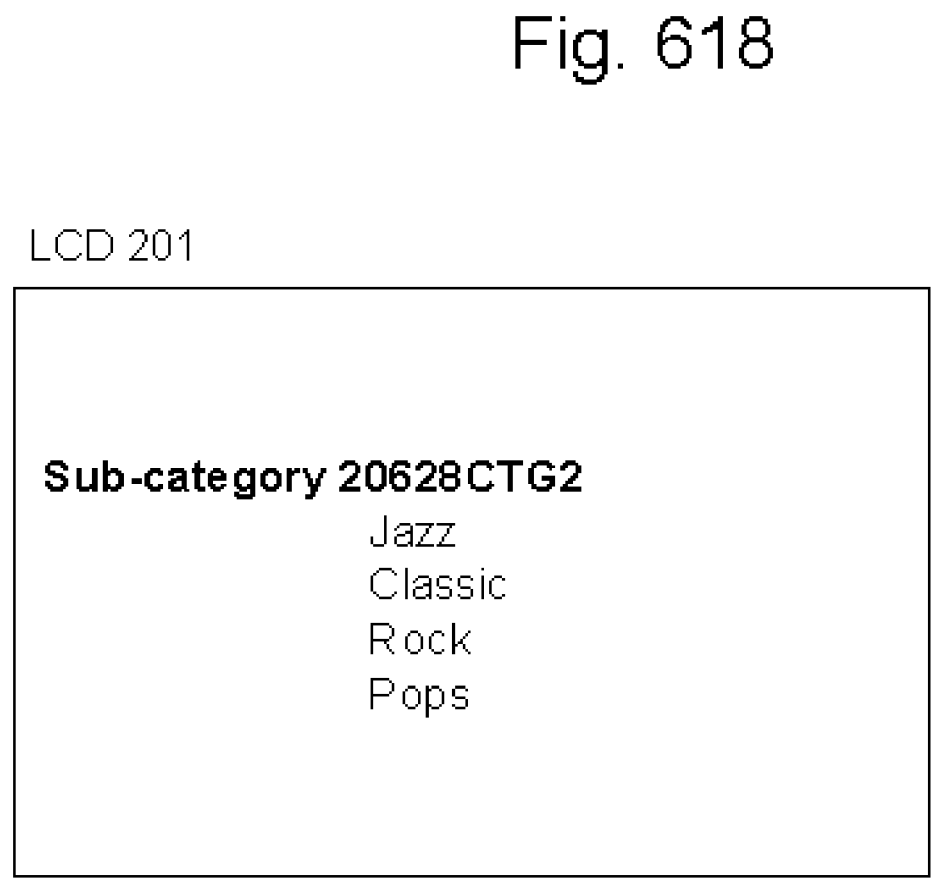

FIG. 618 is a simplified illustration illustrating an exemplary embodiment of the present invention.

Figure 619:
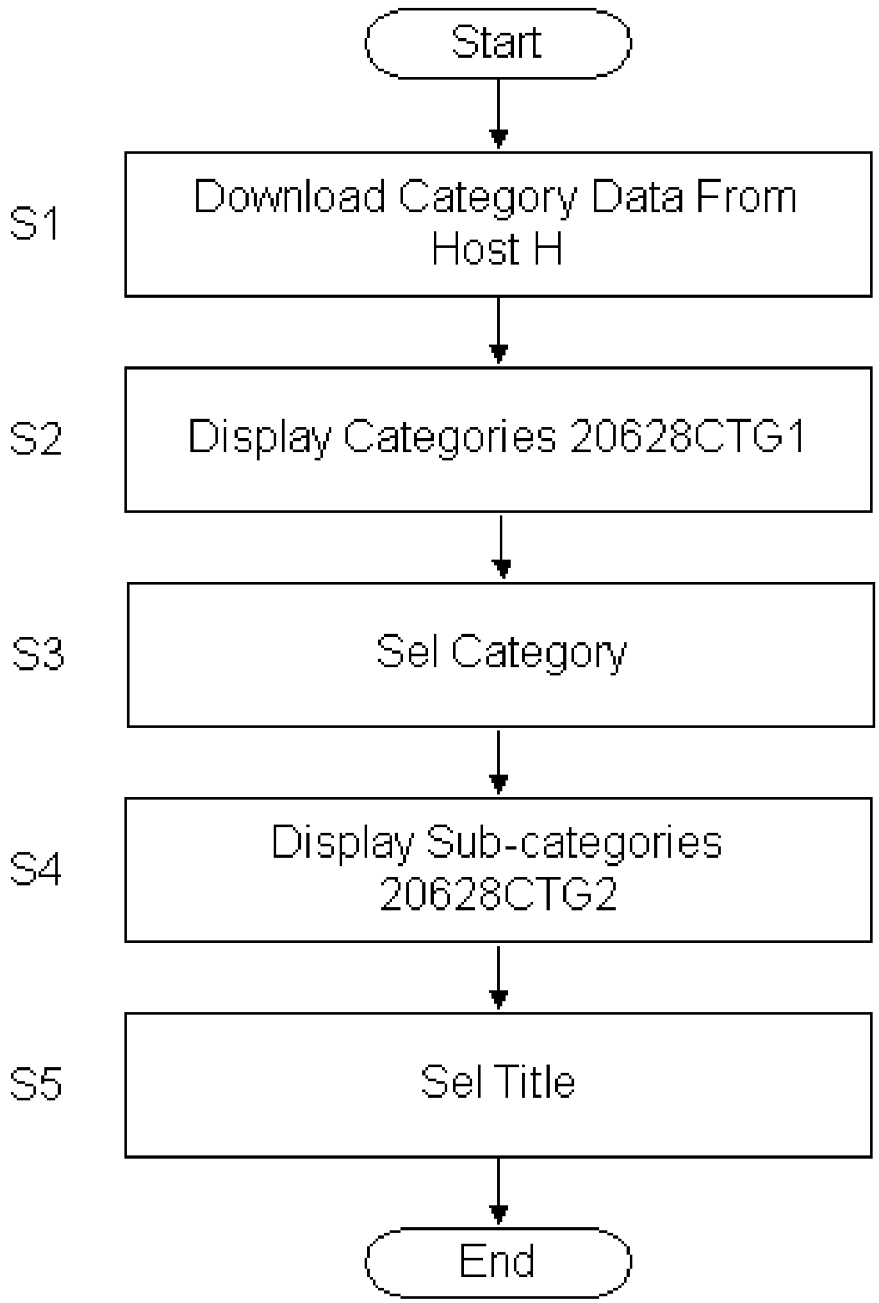

FIG. 619 is a flow chart illustrating an exemplary embodiment of the present invention.

Figure 619A:
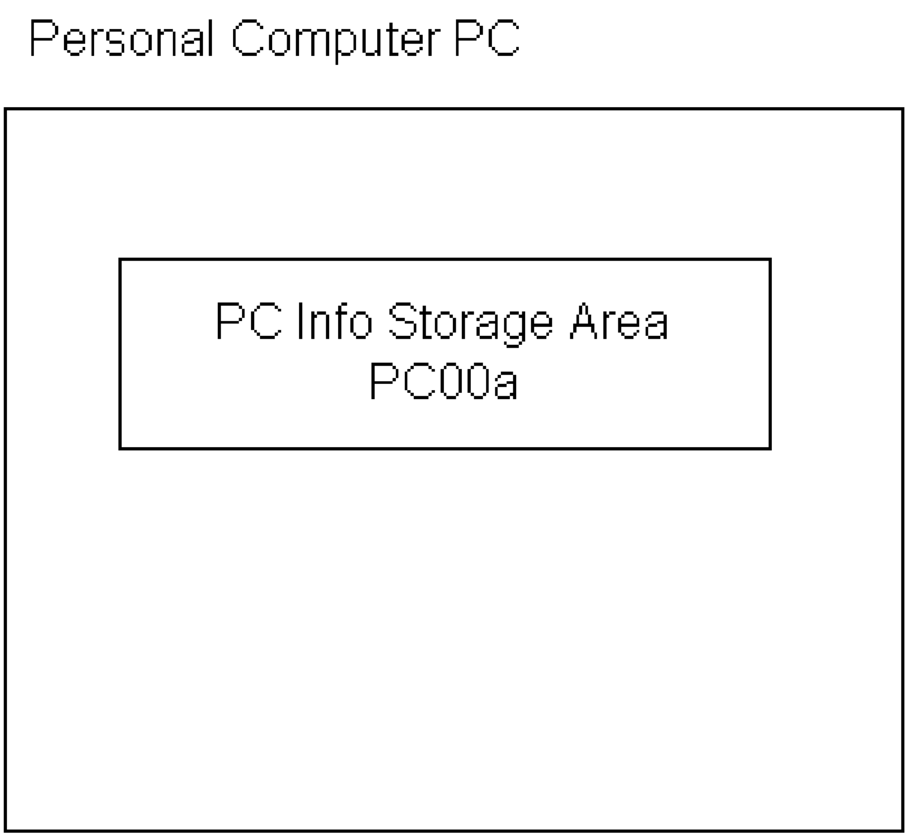

FIG. 619*a* is a block diagram illustrating an exemplary embodiment of the present invention.

Figure 620:
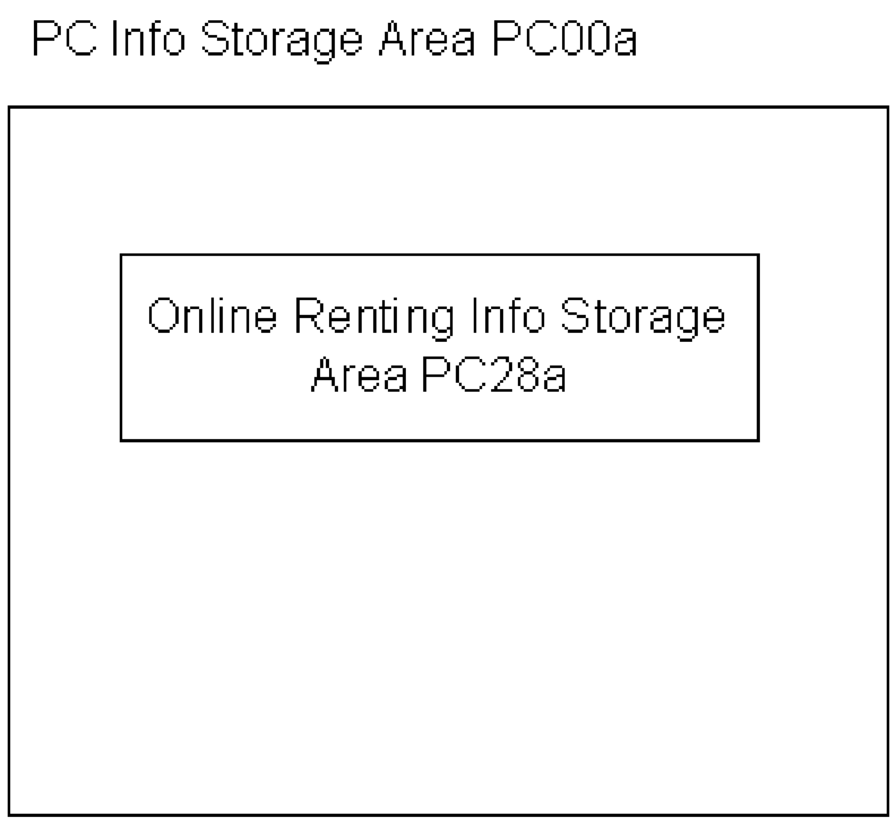

FIG. 620 is a block diagram illustrating an exemplary embodiment of the present invention.

Figure 621:
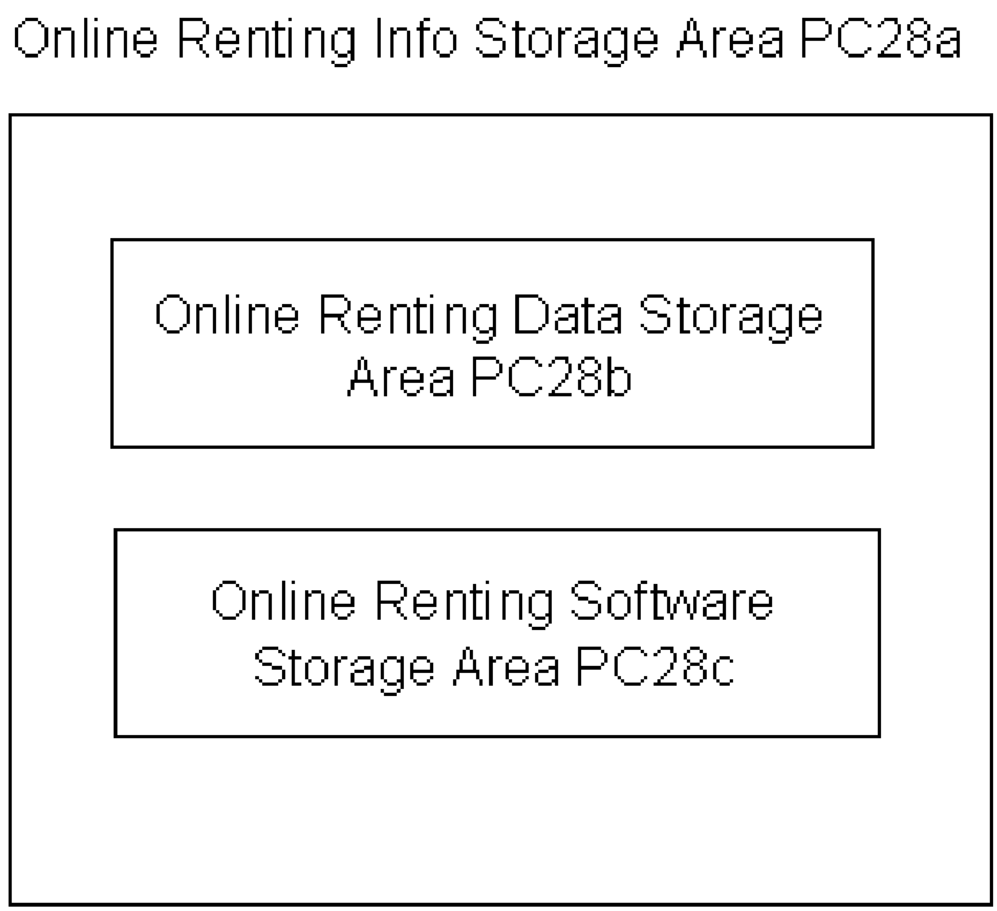

FIG. 621 is a block diagram illustrating an exemplary embodiment of the present invention.

Figure 622:
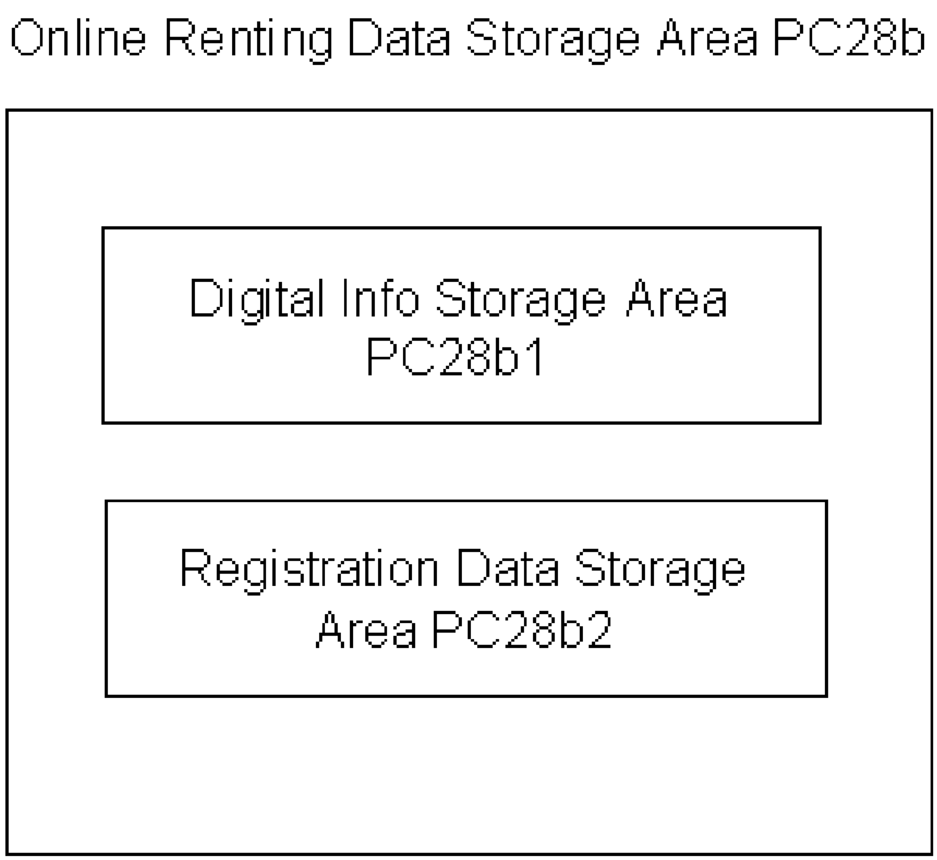

FIG. 622 is a block diagram illustrating an exemplary embodiment of the present invention.

Figure 623:
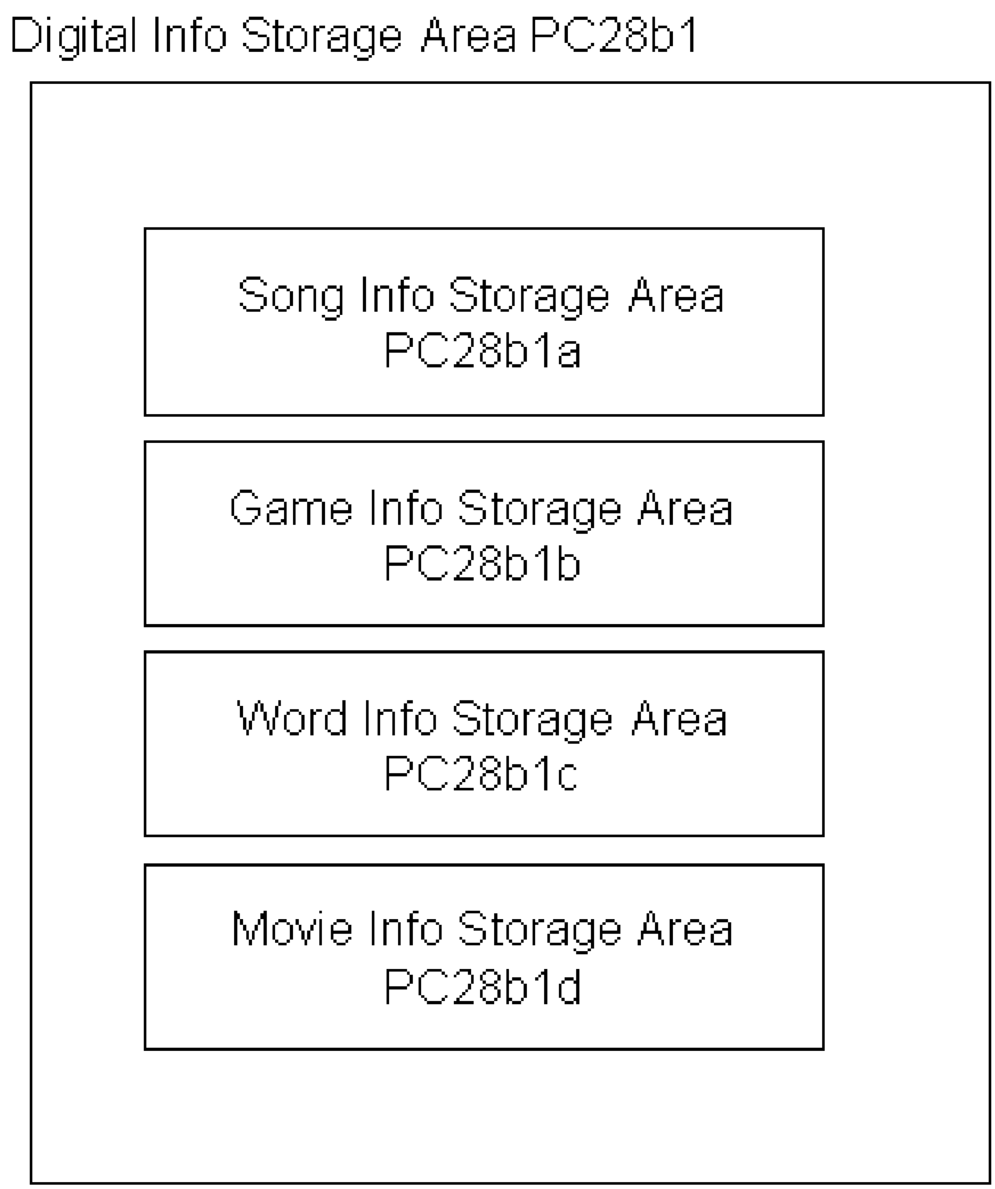

FIG. 623 is a block diagram illustrating an exemplary embodiment of the present invention.

Figure 624:
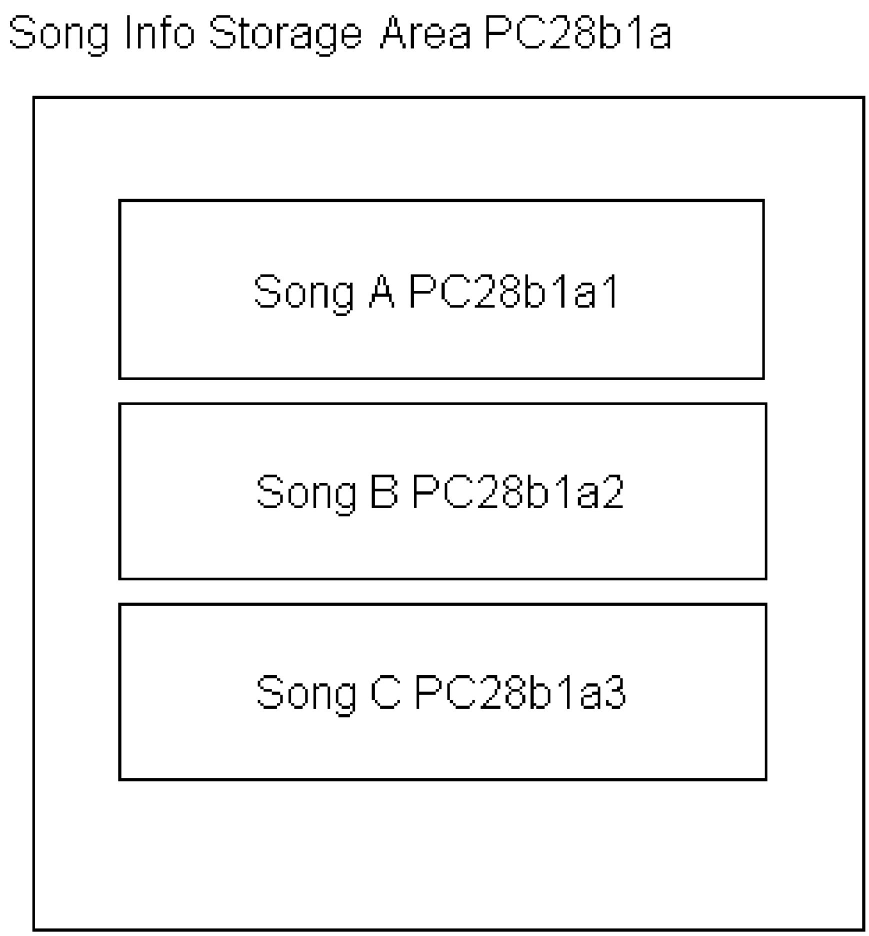

FIG. 624 is a block diagram illustrating an exemplary embodiment of the present invention.

Figure 625:
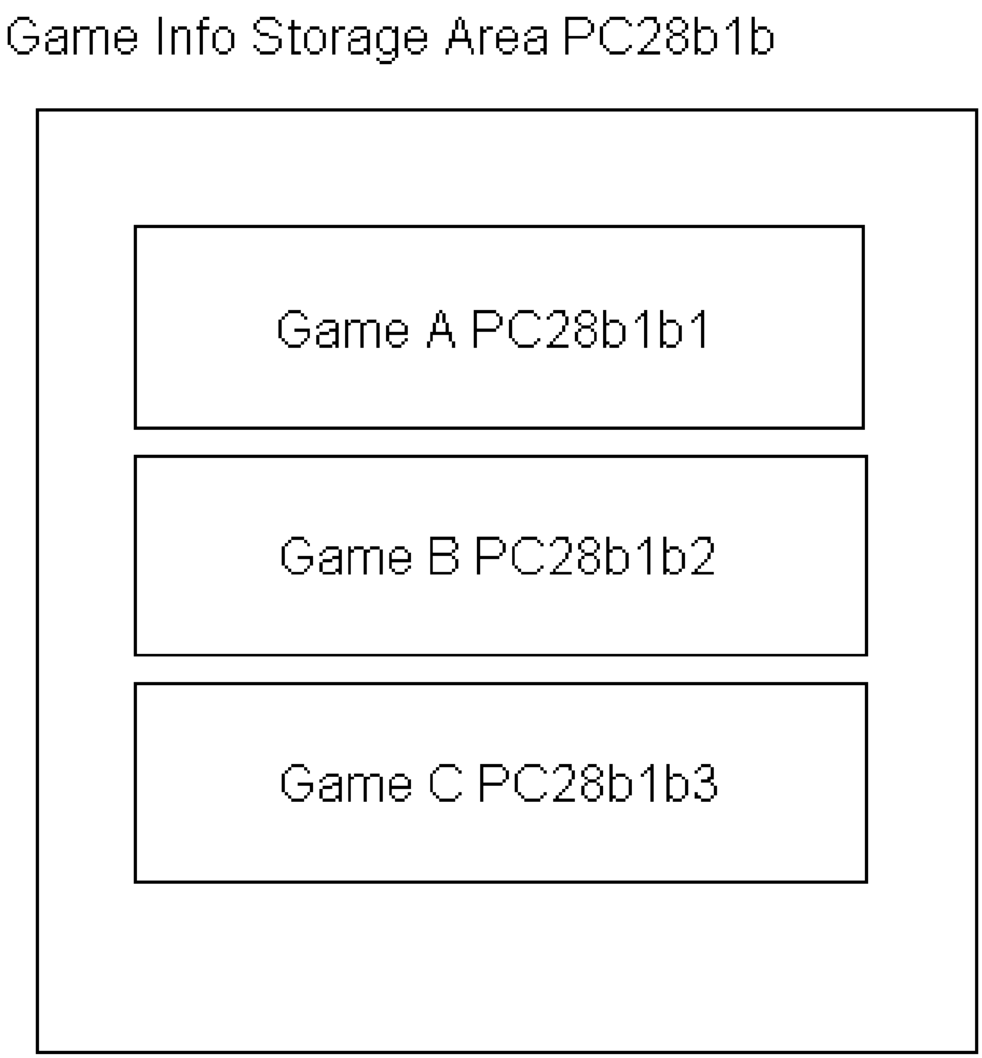

FIG. 625 is a block diagram illustrating an exemplary embodiment of the present invention.

Figure 626:
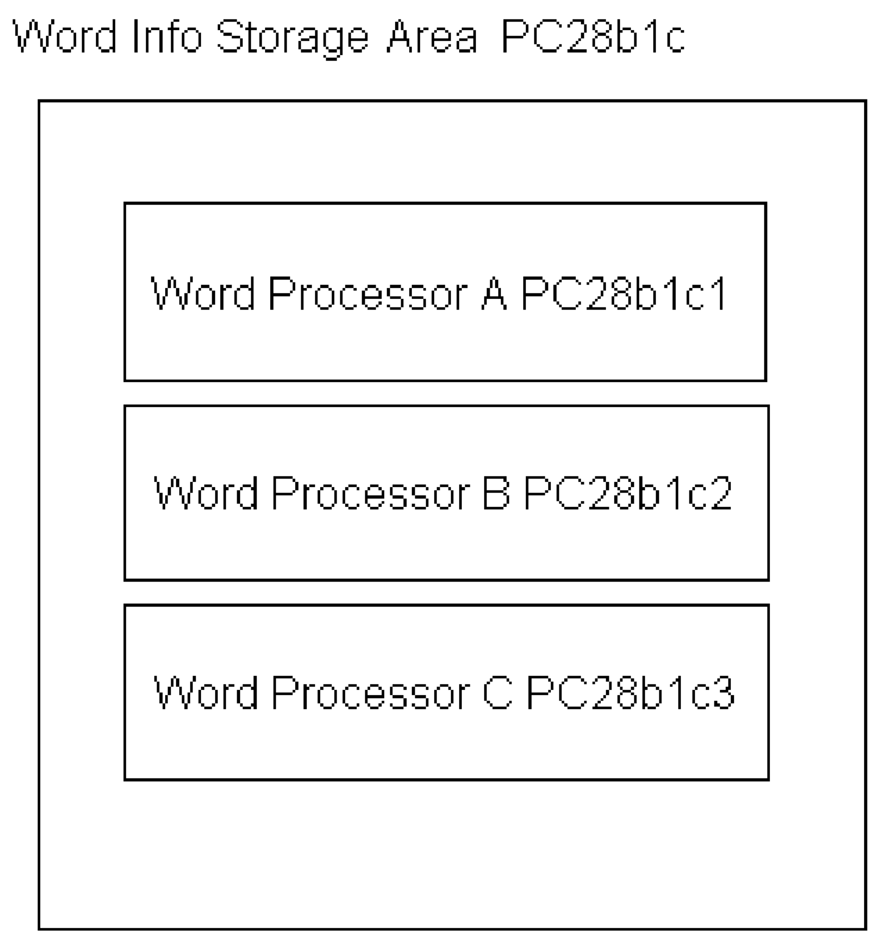

FIG. 626 is a block diagram illustrating an exemplary embodiment of the present invention.

Figure 627:
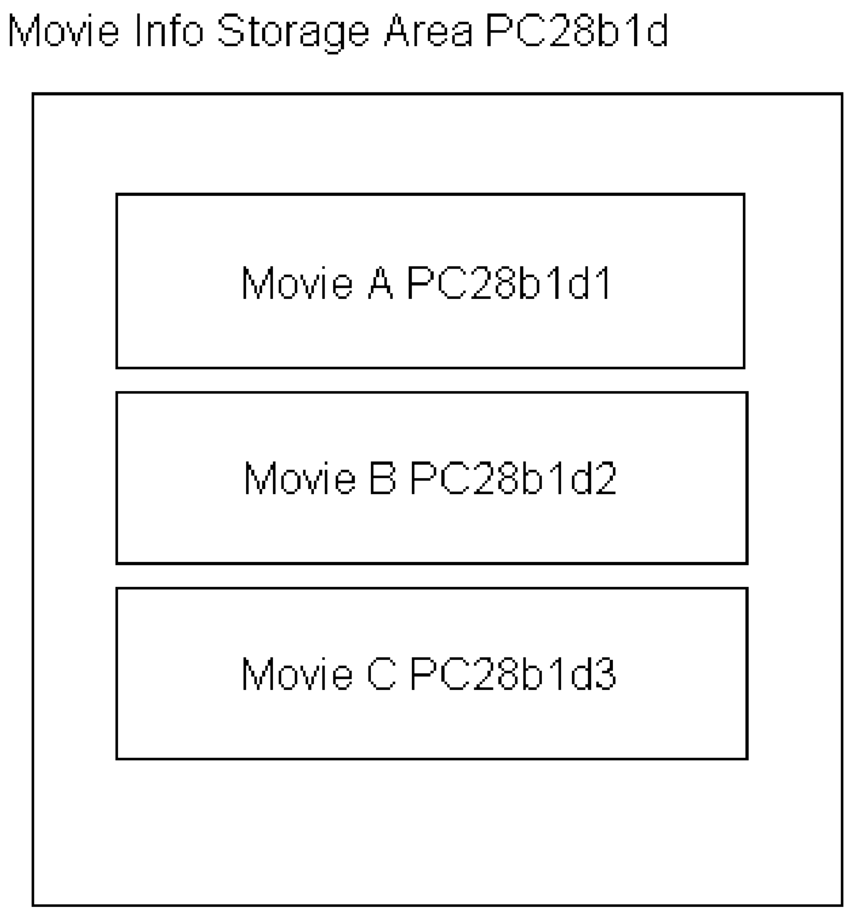

FIG. 627 is a block diagram illustrating an exemplary embodiment of the present invention.

Figure 628:
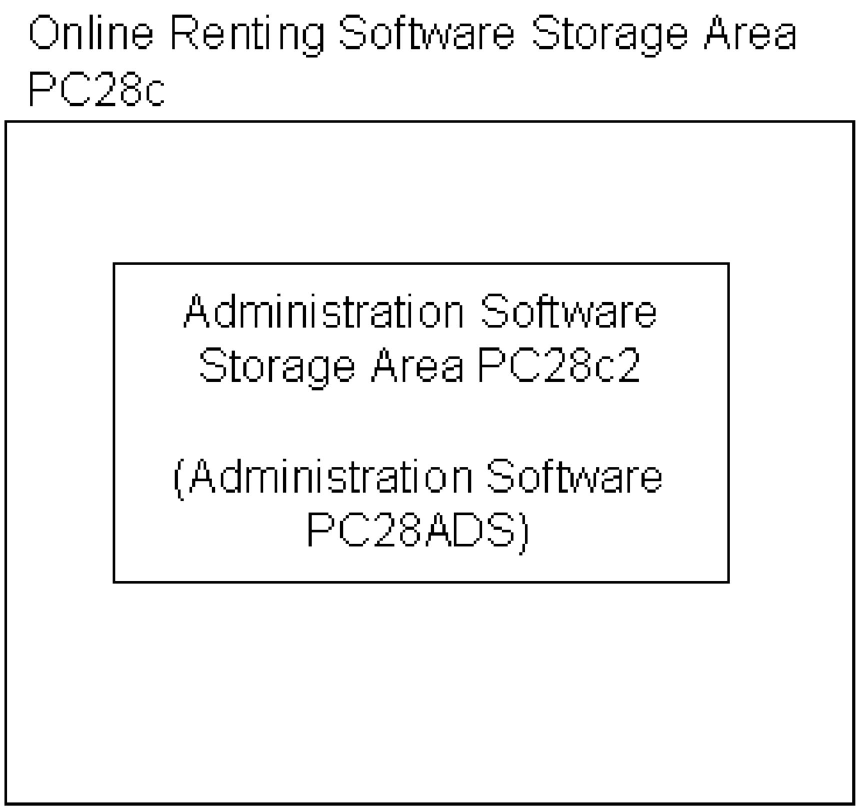

FIG. 628 is a block diagram illustrating an exemplary embodiment of the present invention.

Figure 629:
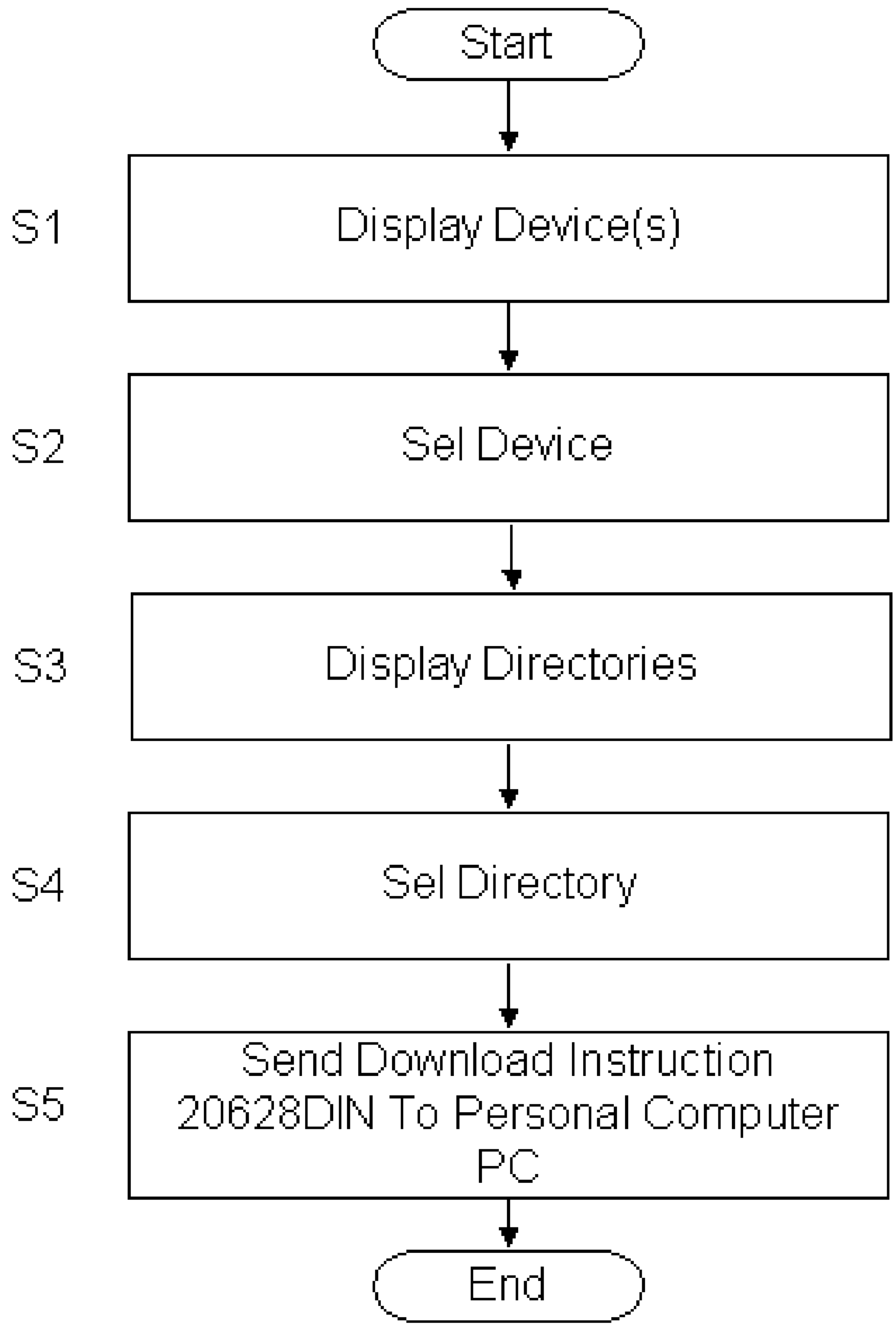

FIG. 629 is a flow chart illustrating an exemplary embodiment of the present invention.

Figure 630:
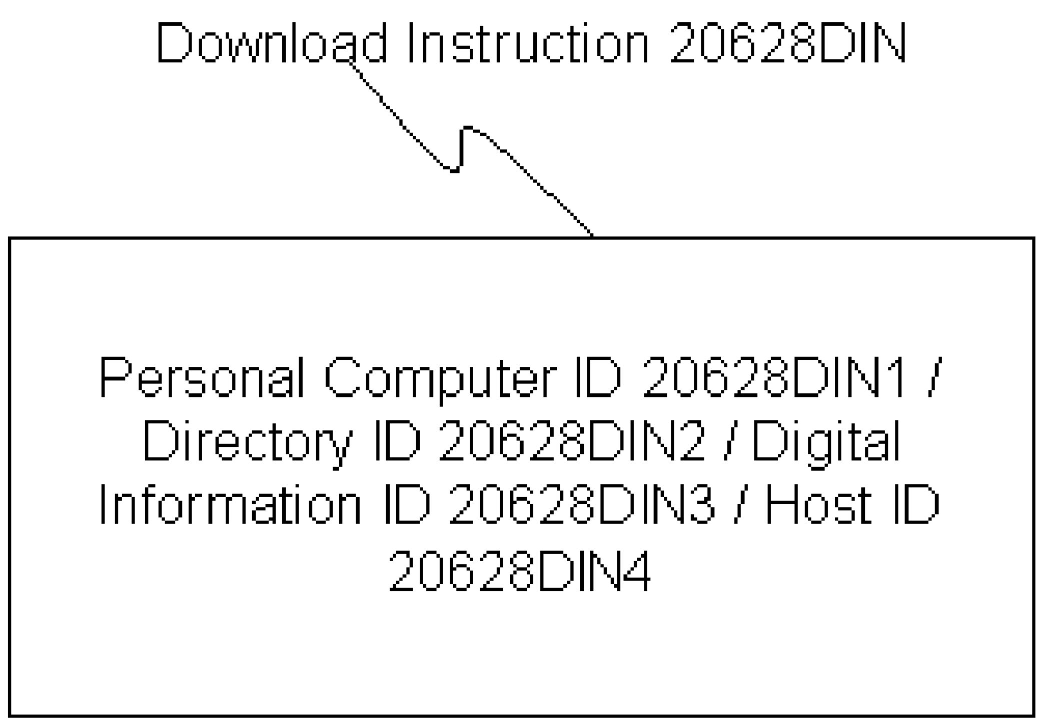

FIG. 630 is a simplified illustration of data utilized in the present invention.

Figure 631:
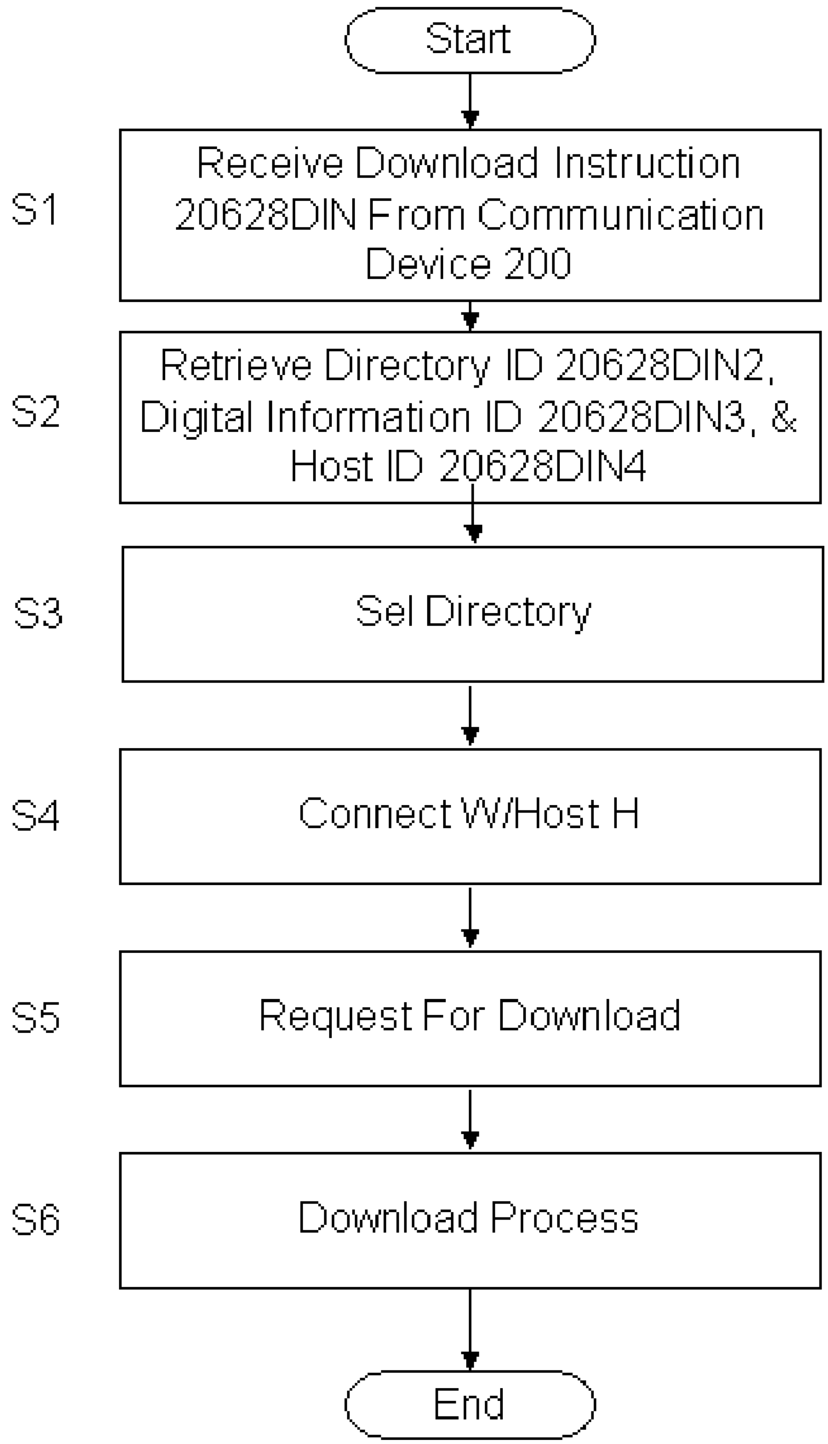

FIG. 631 is a flow chart illustrating an exemplary embodiment of the present invention.

Figure 632:
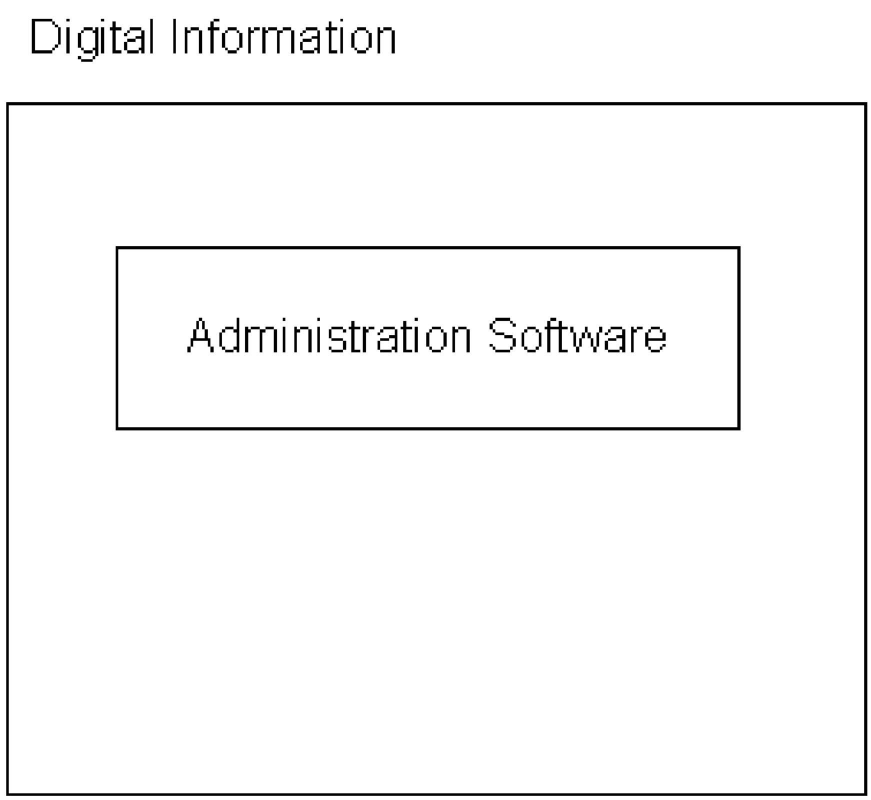

FIG. 632 is a simplified illustration illustrating an exemplary embodiment of the present invention.

Figure 633:
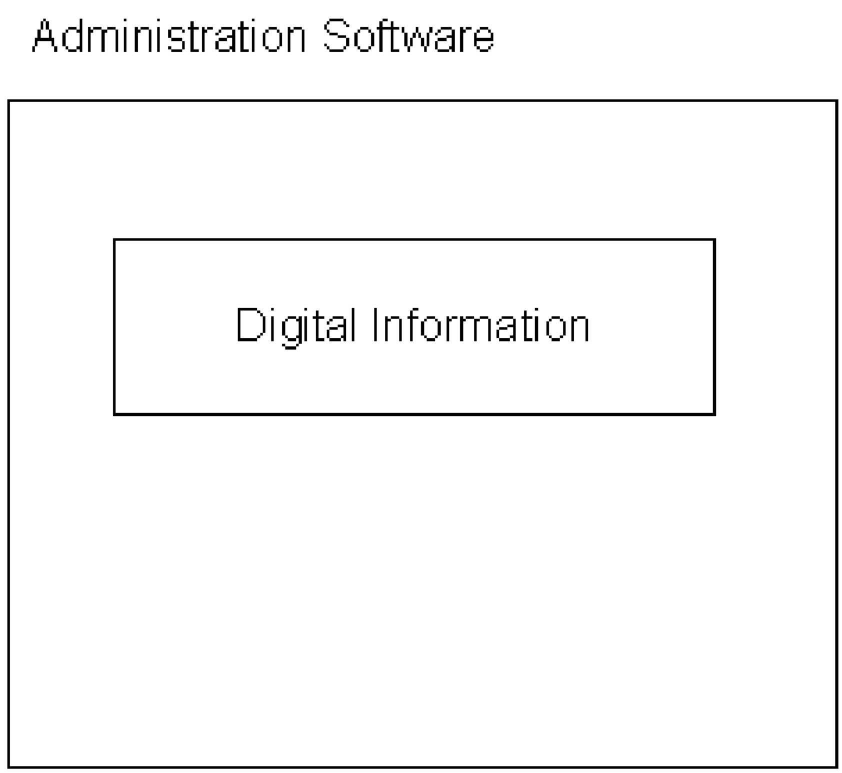

FIG. 633 is a simplified illustration illustrating an exemplary embodiment of the present invention.

Figure 634:
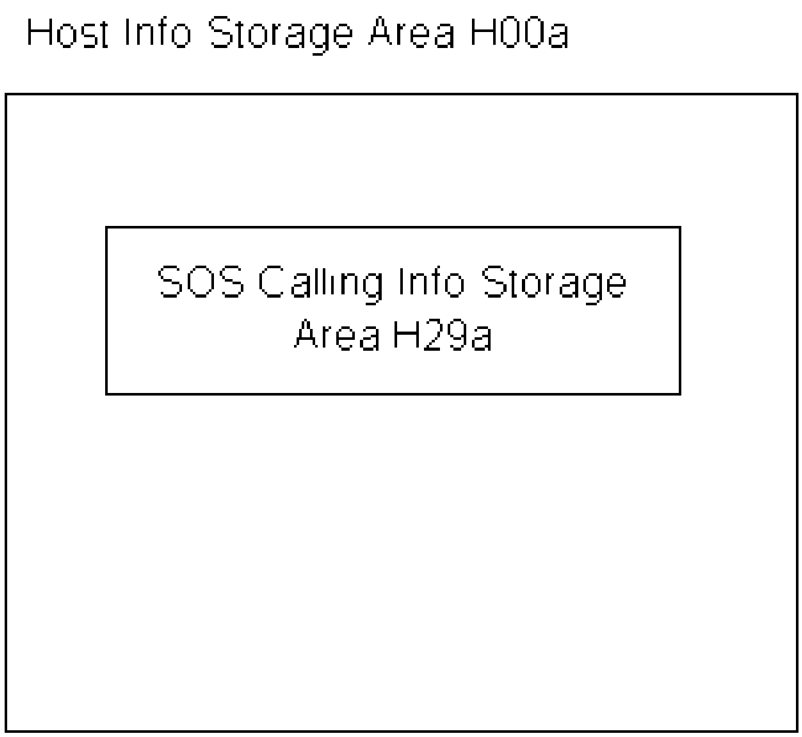

FIG. 634 is a block diagram illustrating an exemplary embodiment of the present invention.

Figure 635:
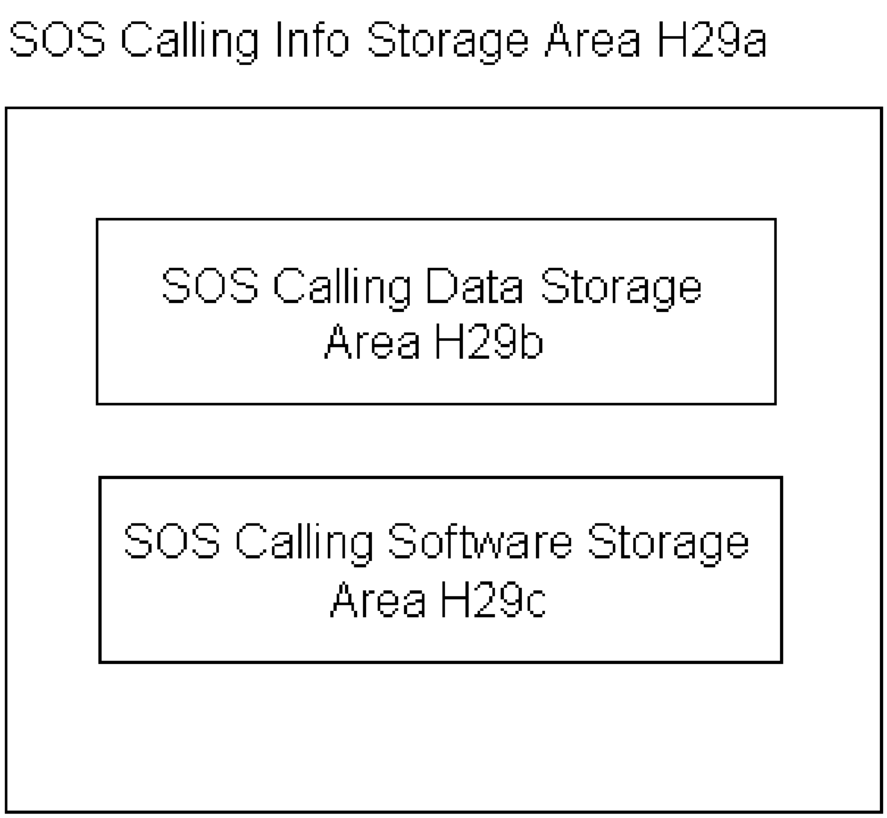

FIG. 635 is a block diagram illustrating an exemplary embodiment of the present invention.

Figure 636:
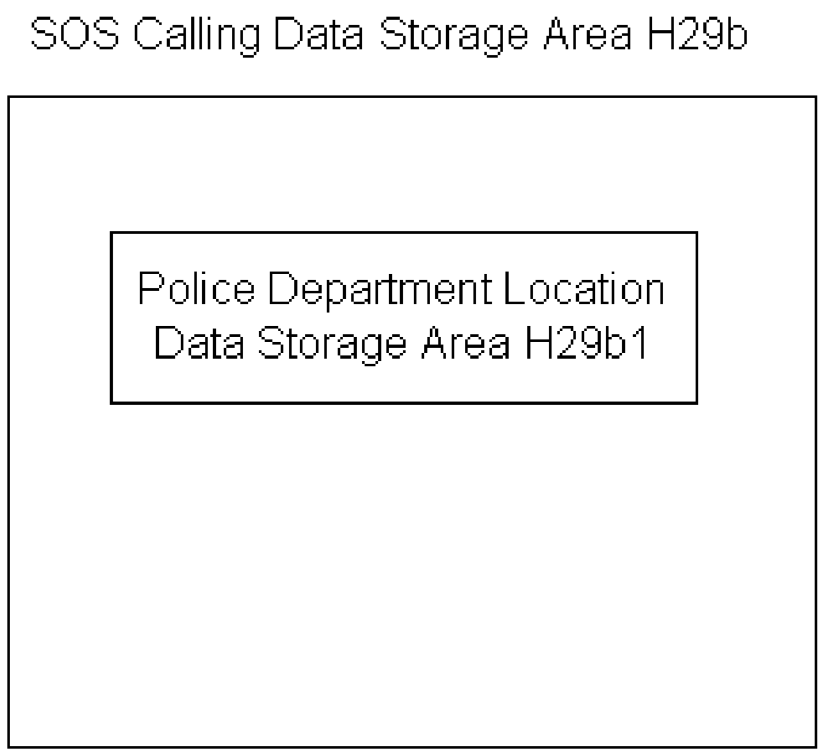

FIG. 636 is a block diagram illustrating an exemplary embodiment of the present invention.

FIG. 637 is a block diagram illustrating an exemplary embodiment of the present invention.

Figure 638:
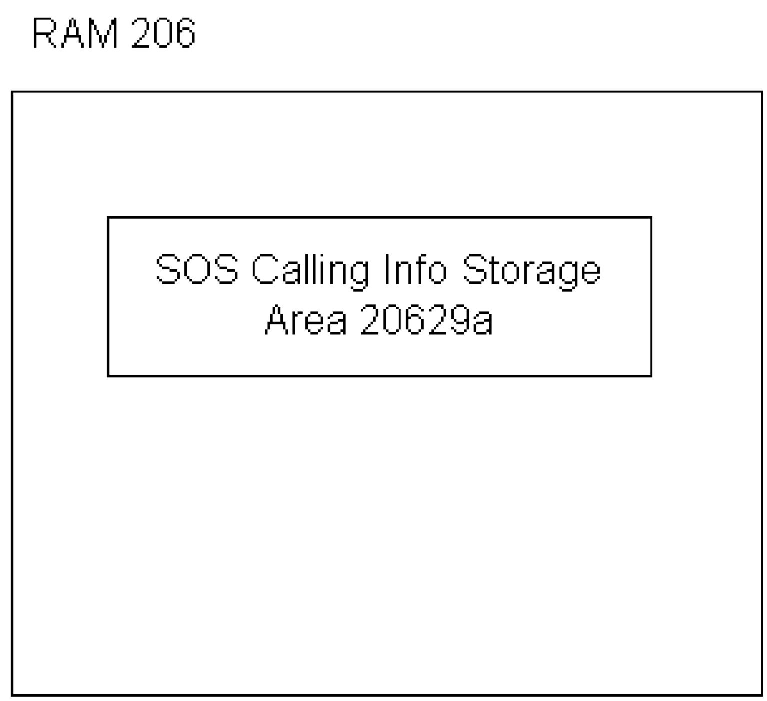

FIG. 638 is a block diagram illustrating an exemplary embodiment of the present invention.

Figure 639:
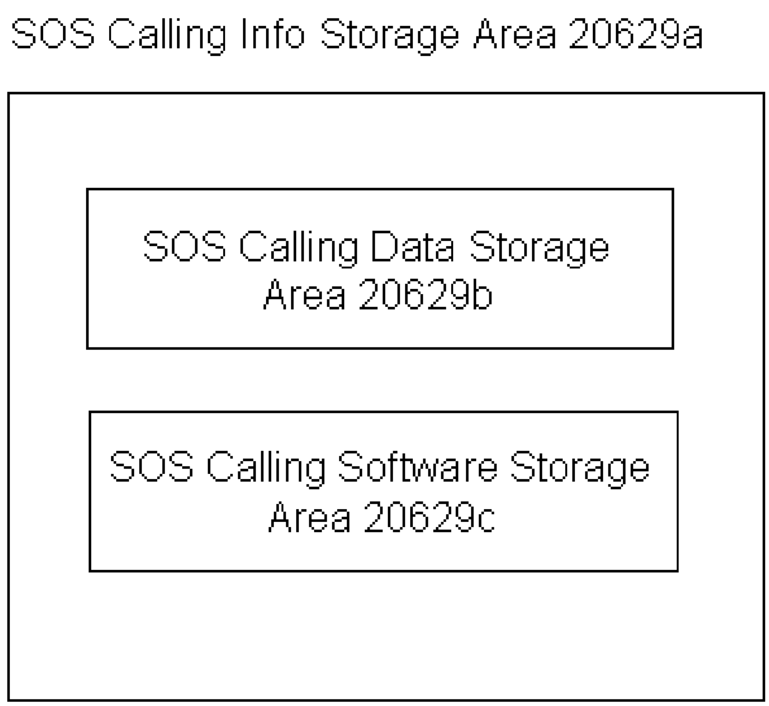

FIG. 639 is a block diagram illustrating an exemplary embodiment of the present invention.

Figure 640:
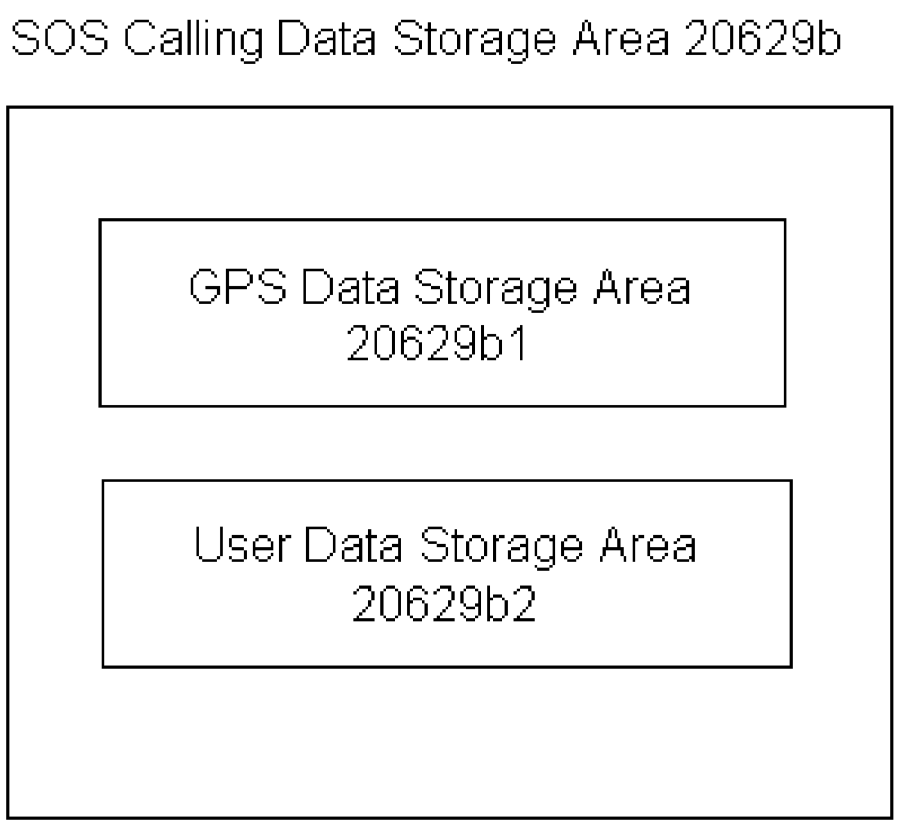

FIG. 640 is a block diagram illustrating an exemplary embodiment of the present invention.

Figure 641:
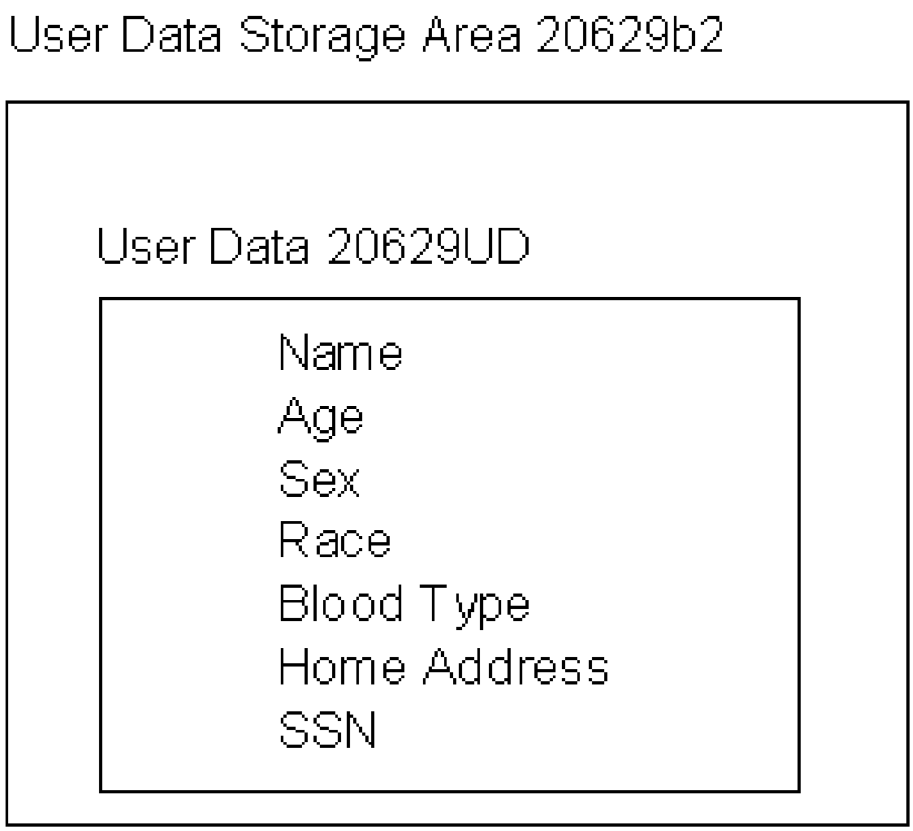

FIG. 641 is a block diagram illustrating an exemplary embodiment of the present invention.

Figure 642:
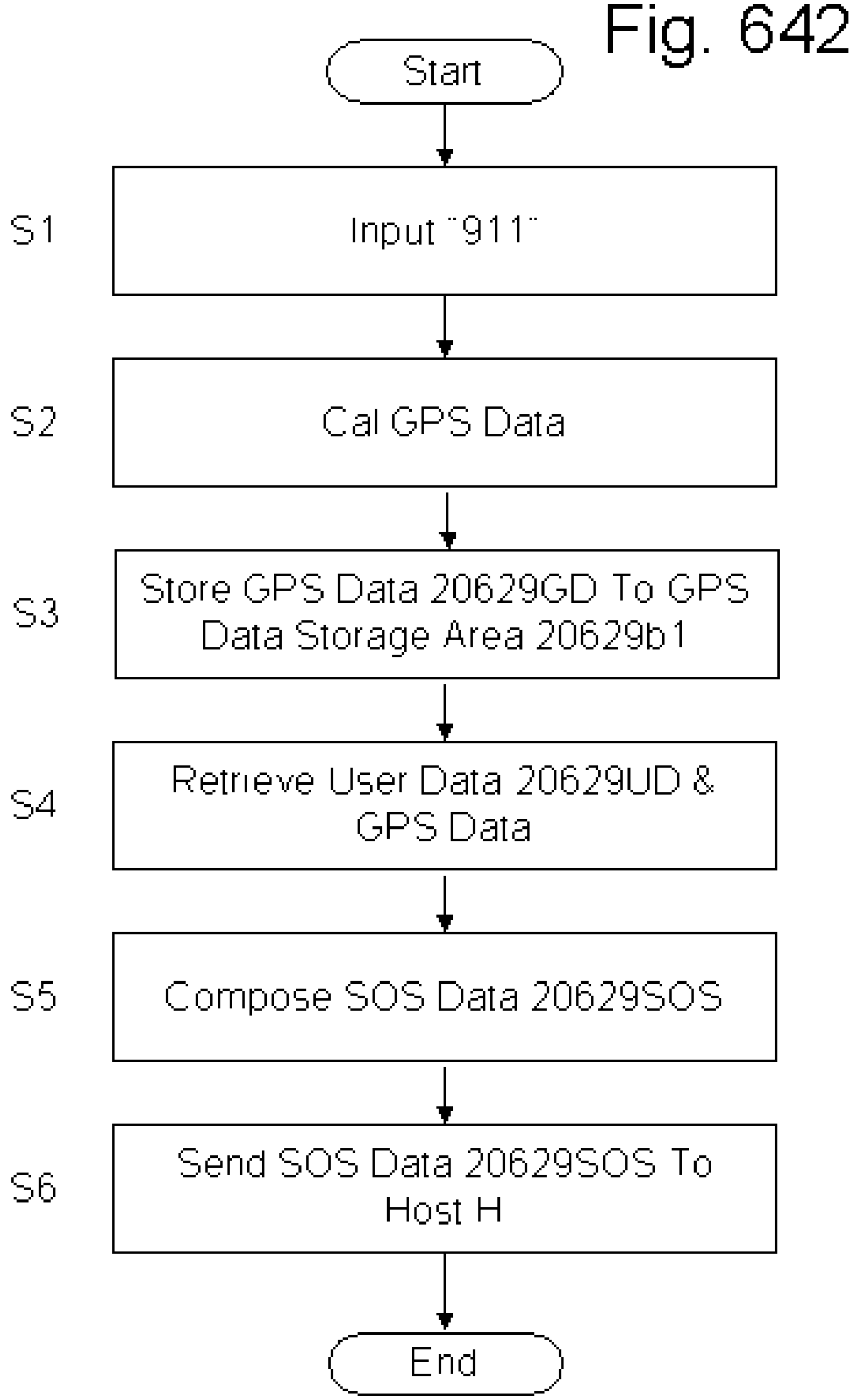

FIG. 642 is a flowchart illustrating an exemplary embodiment of the present invention.

Figure 643:
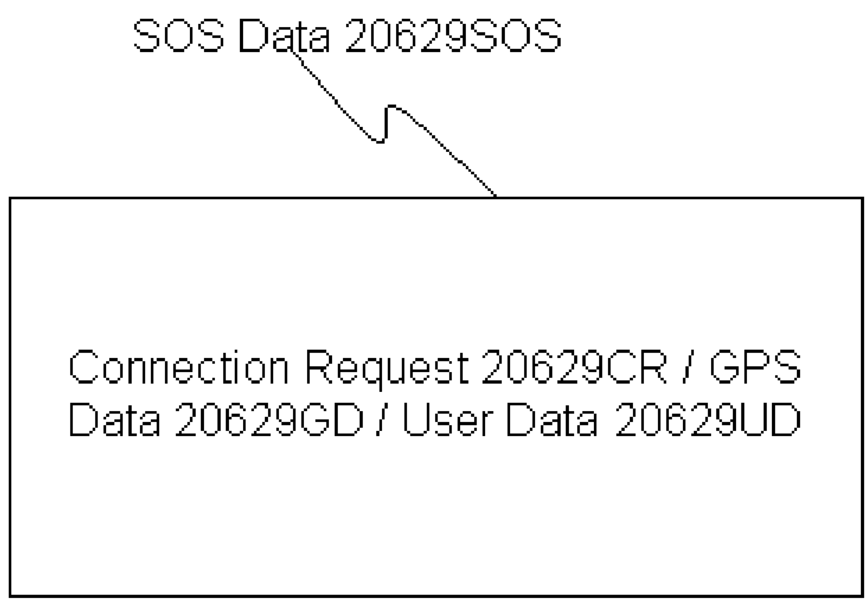

FIG. 643 is a simplified illustration of data utilized in the present invention.

Figure 644:
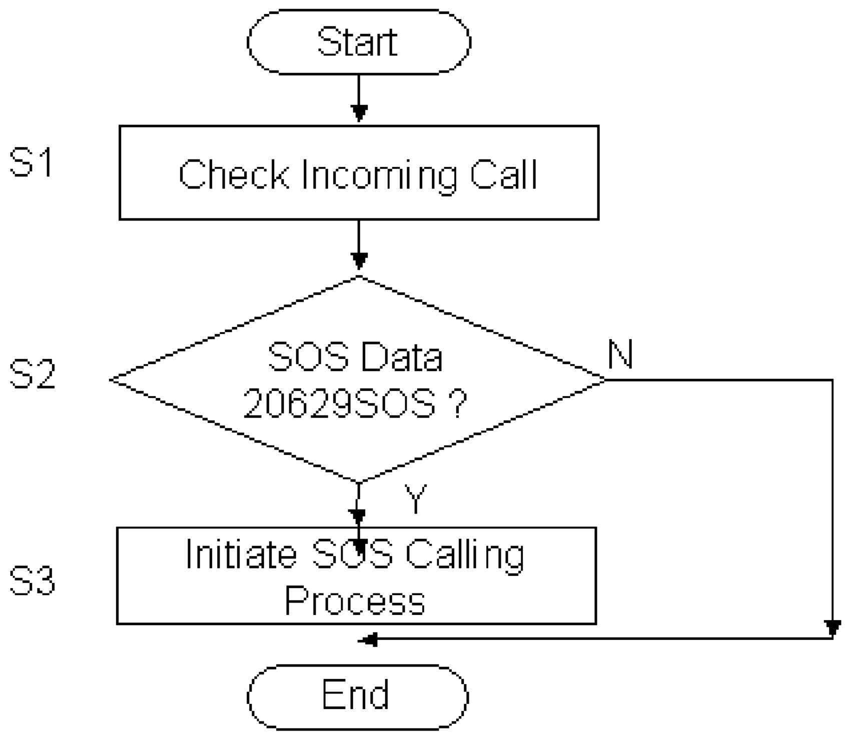

FIG. 644 is a flowchart illustrating an exemplary embodiment of the present invention.

Figure 645:
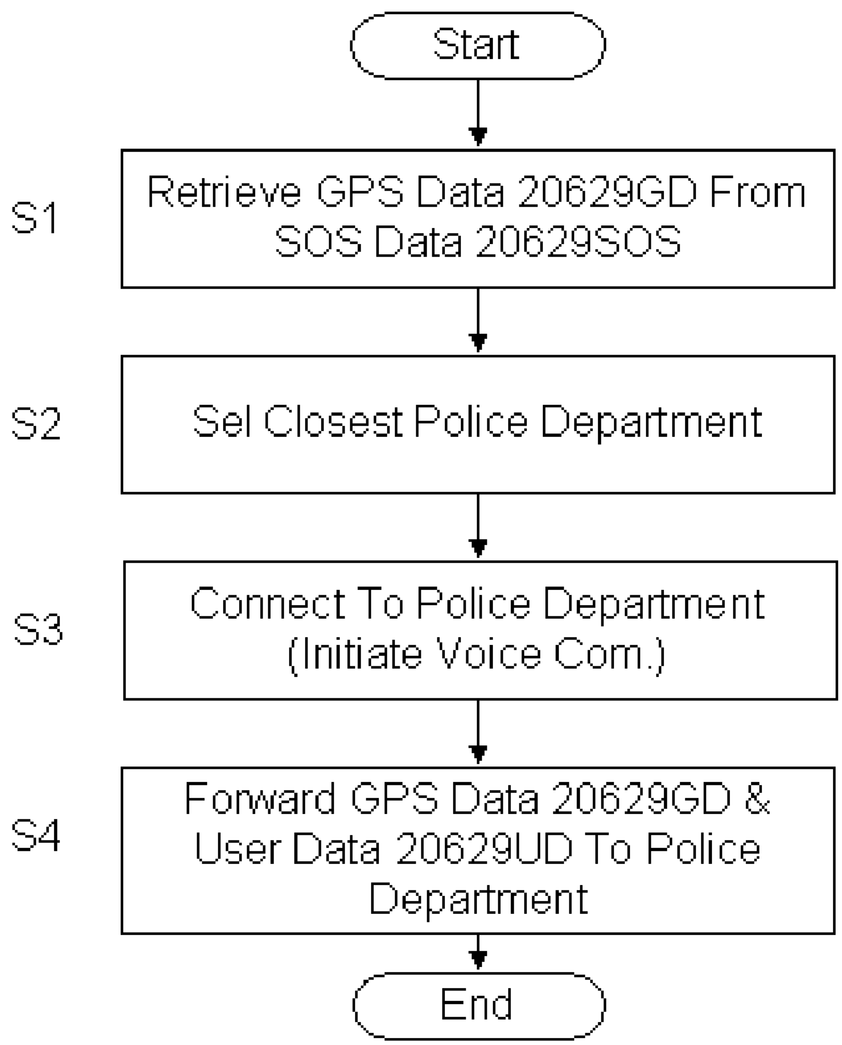

FIG. 645 is a flowchart illustrating an exemplary embodiment of the present invention.

Figure 646:
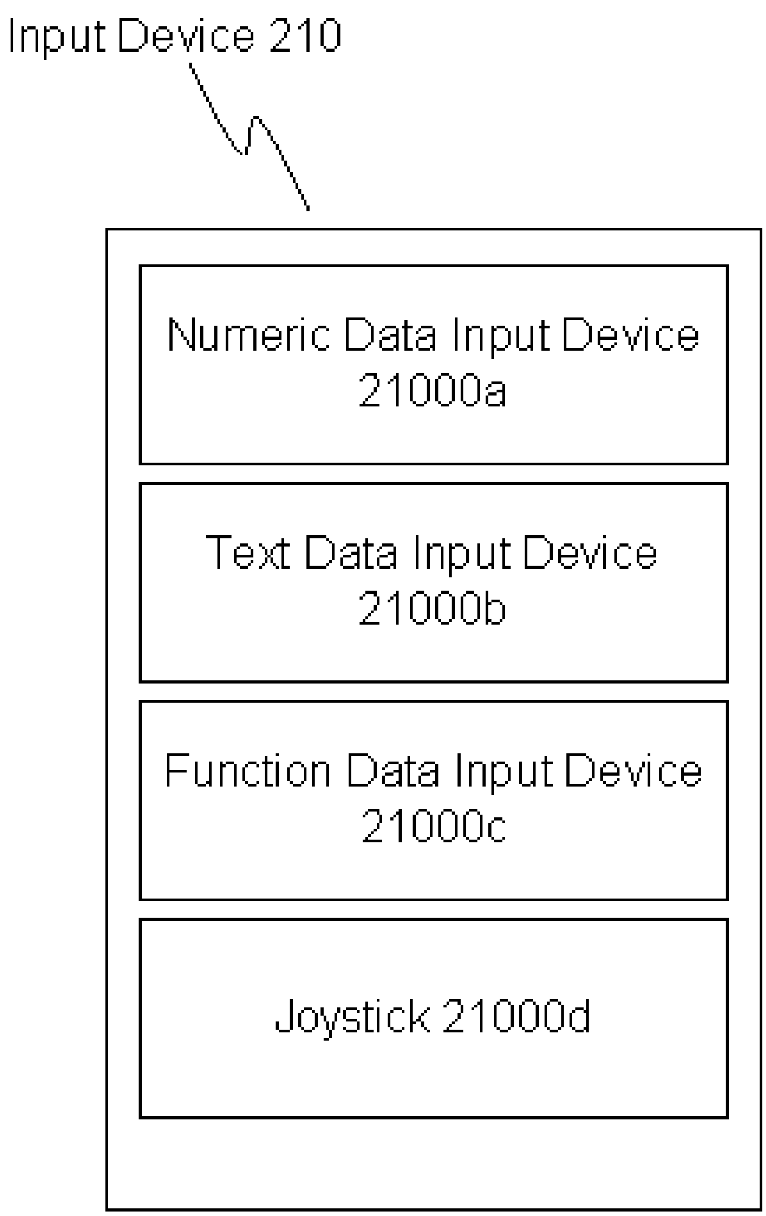

FIG. 646 is a simplified illustration illustrating an exemplary embodiment of the present invention.

Figure 647:
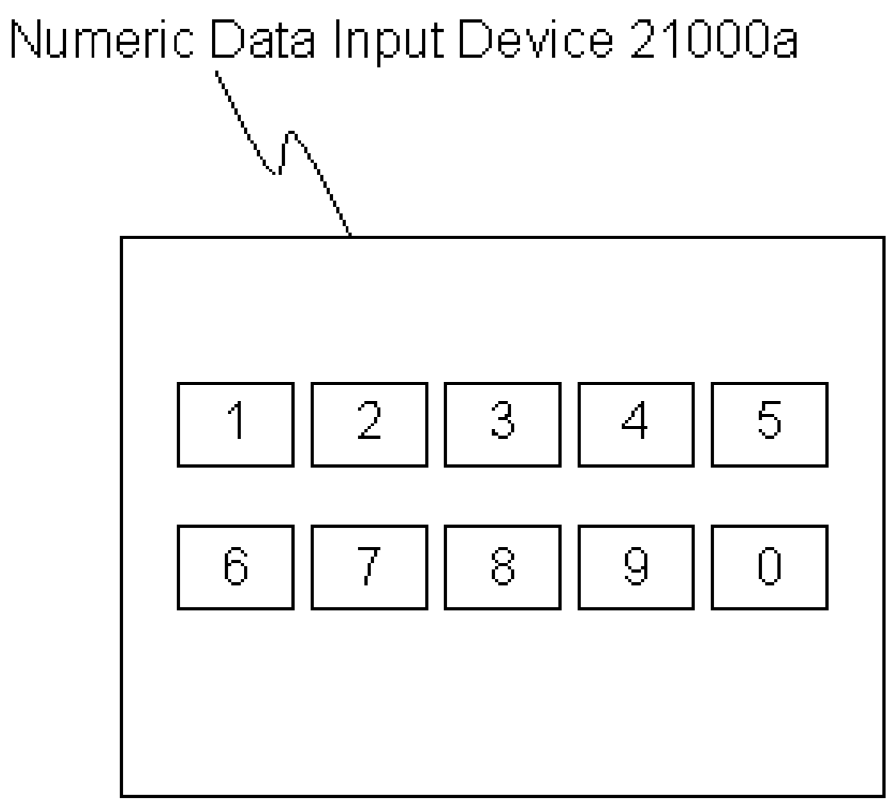

FIG. 647 is a simplified illustration illustrating an exemplary embodiment of the present invention.

Figure 648:
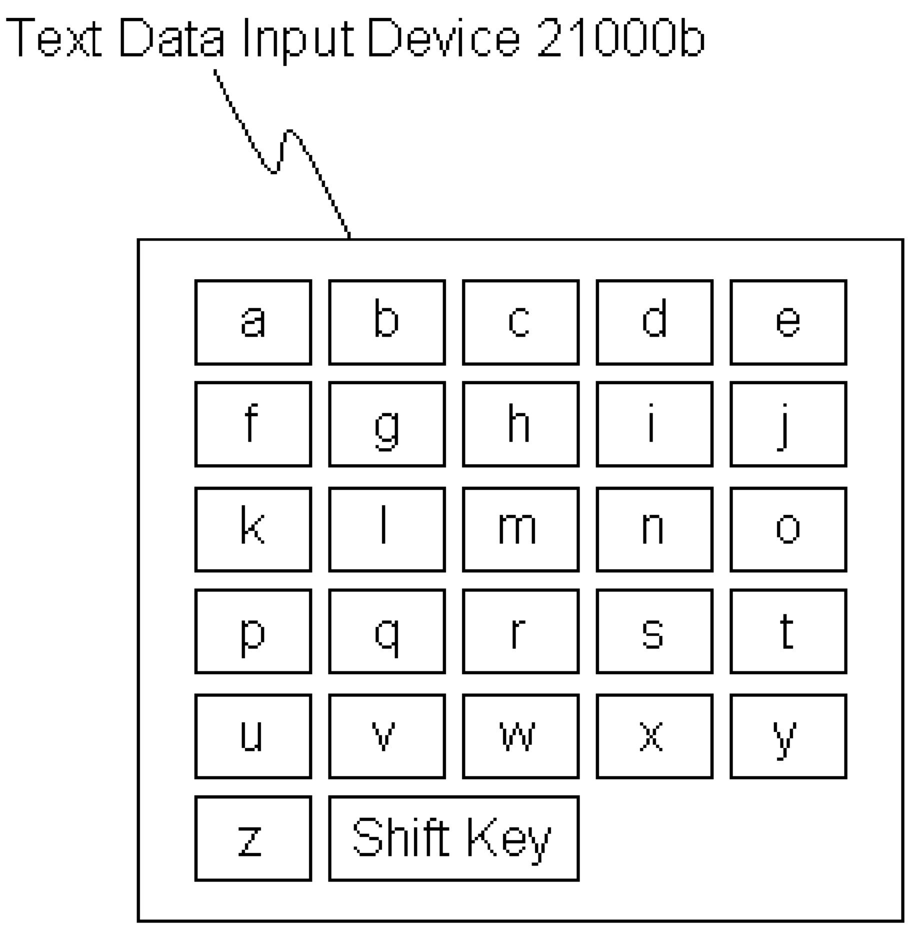

FIG. 648 is a simplified illustration illustrating an exemplary embodiment of the present invention.

Figure 649:
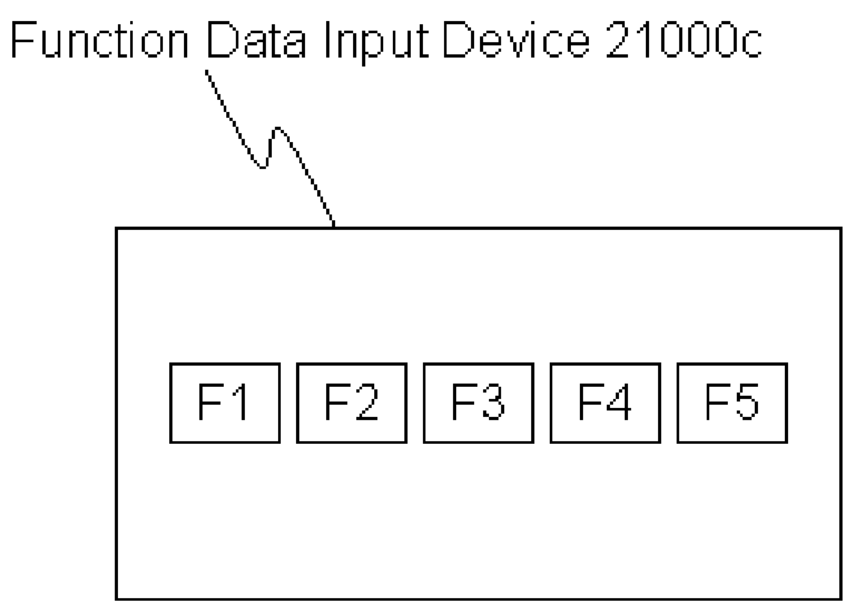

FIG. 649 is a simplified illustration illustrating an exemplary embodiment of the present invention.

Figure 650:
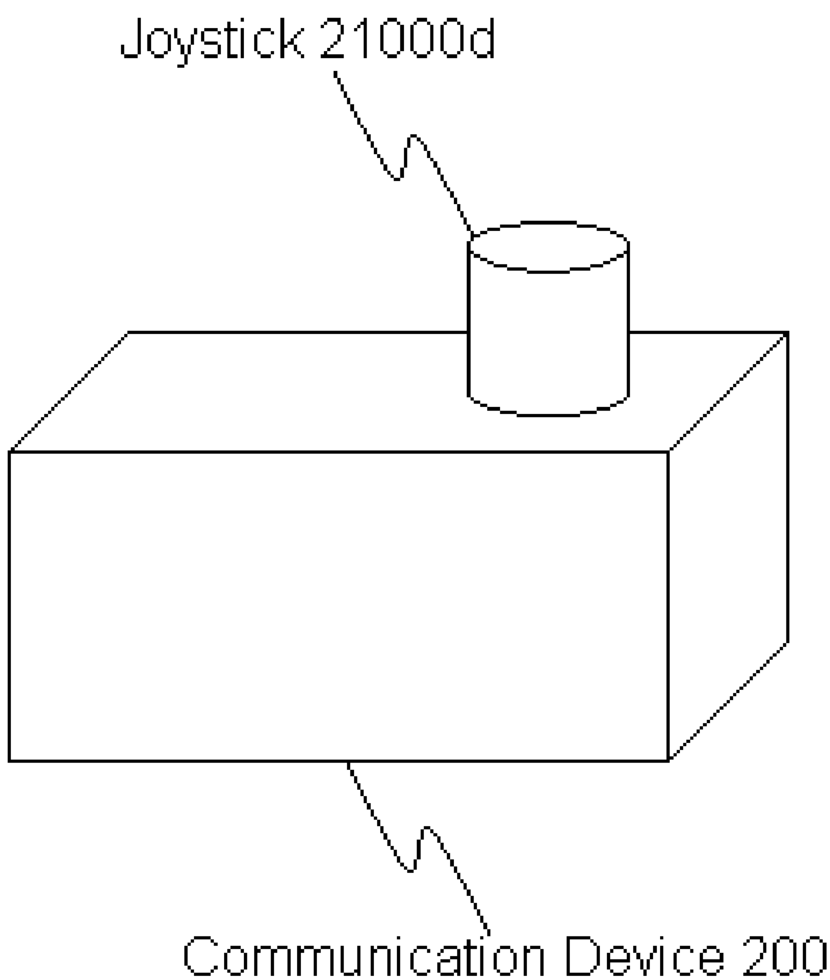

FIG. 650 is a simplified illustration illustrating an exemplary embodiment of the present invention.

Figure 651:
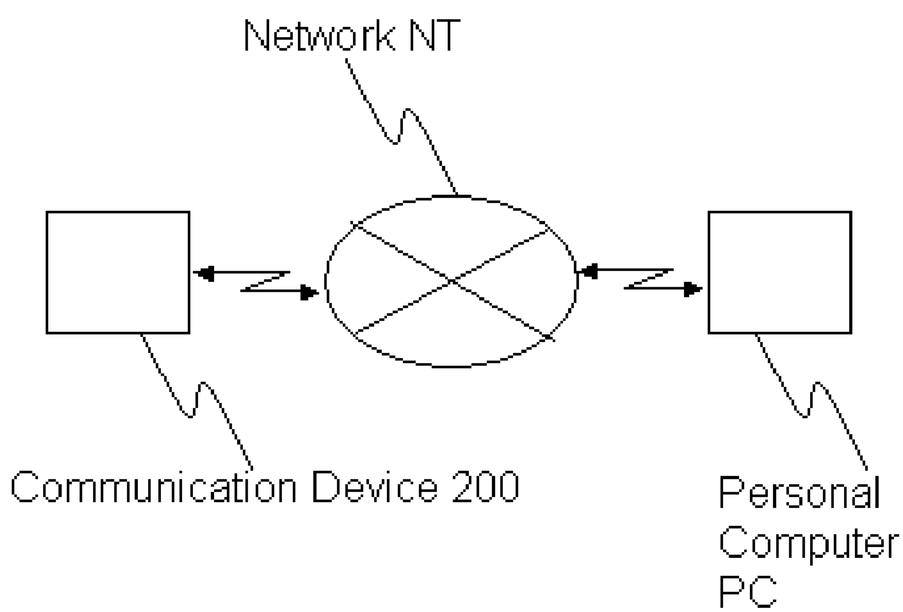

FIG. 651 is a simplified illustration illustrating an exemplary embodiment of the present invention.

Figure 652:
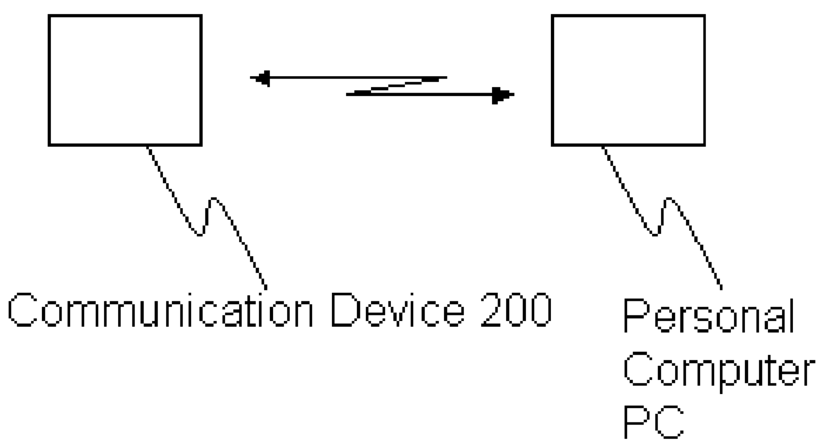

FIG. 652 is a simplified illustration illustrating an exemplary embodiment of the present invention.

Figure 653:
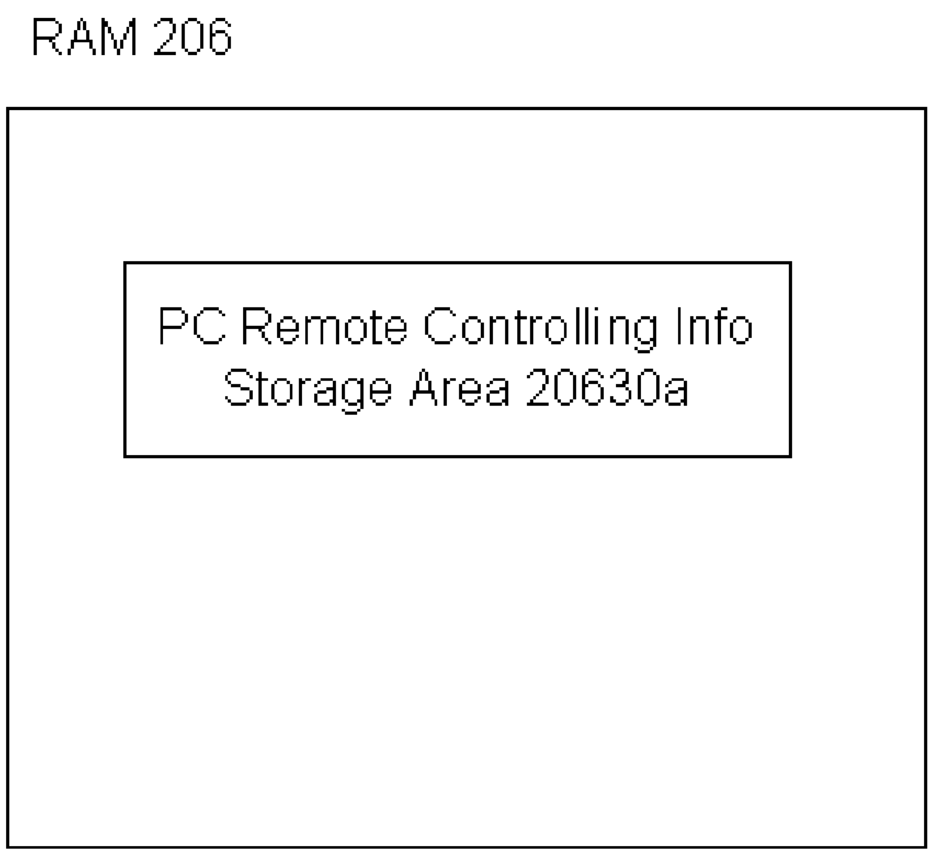

FIG. 653 is a block diagram illustrating an exemplary embodiment of the present invention.

Figure 654:
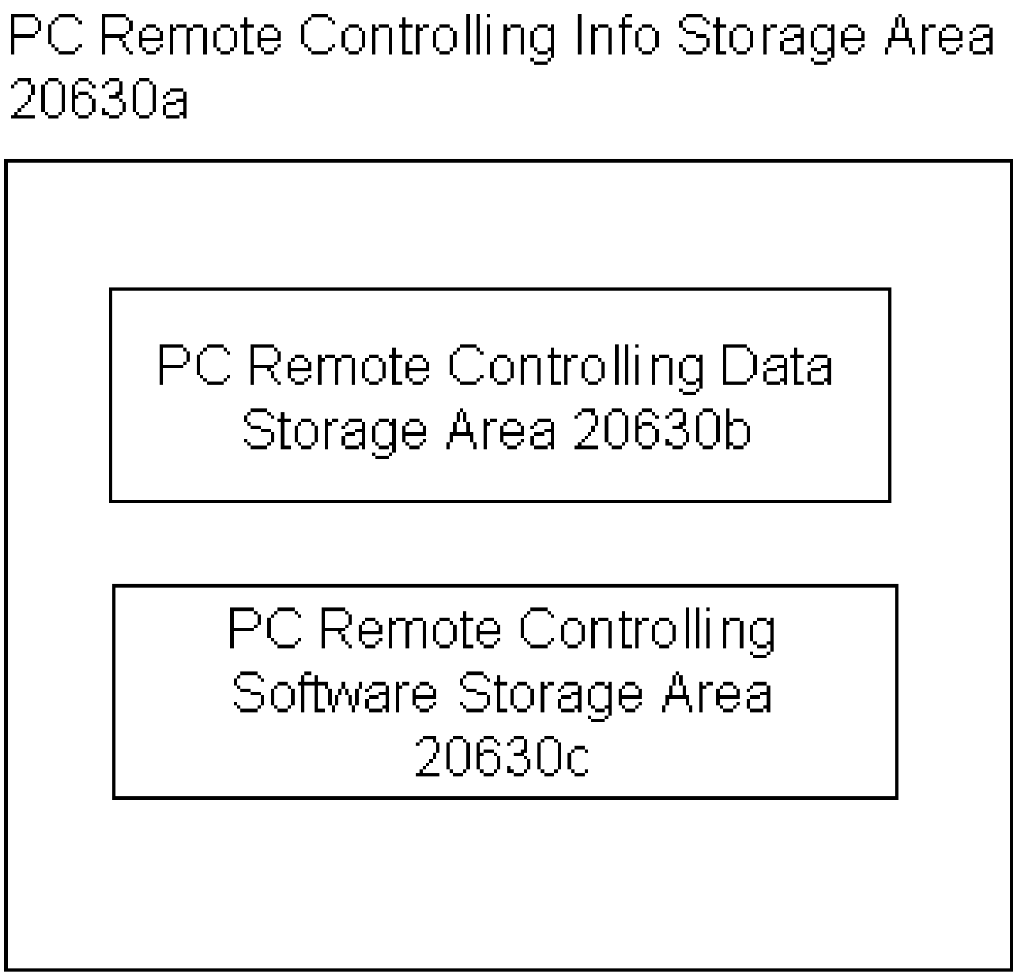

FIG. 654 is a block diagram illustrating an exemplary embodiment of the present invention.

Figure 655:
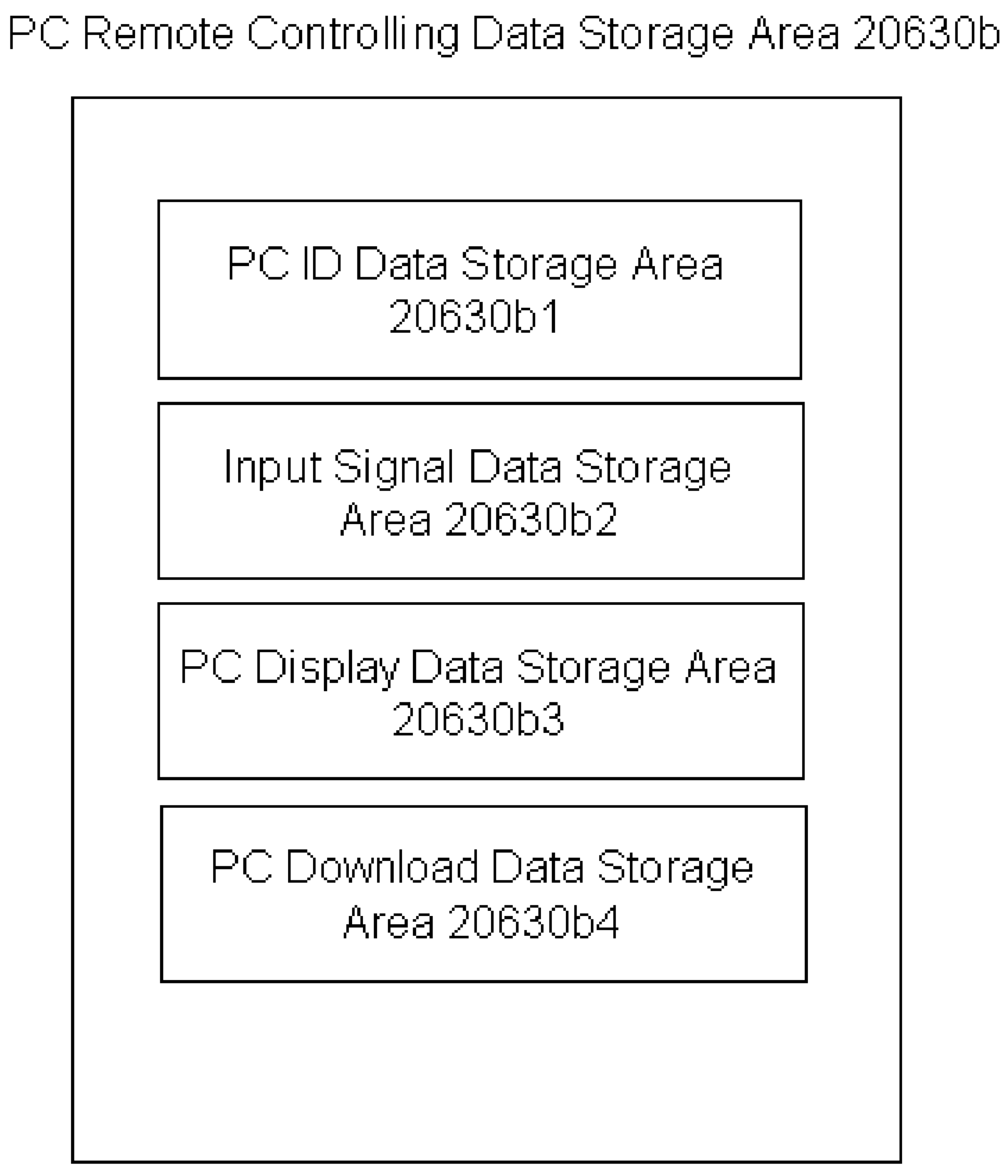

FIG. 655 is a block diagram illustrating an exemplary embodiment of the present invention.

Figure 656:
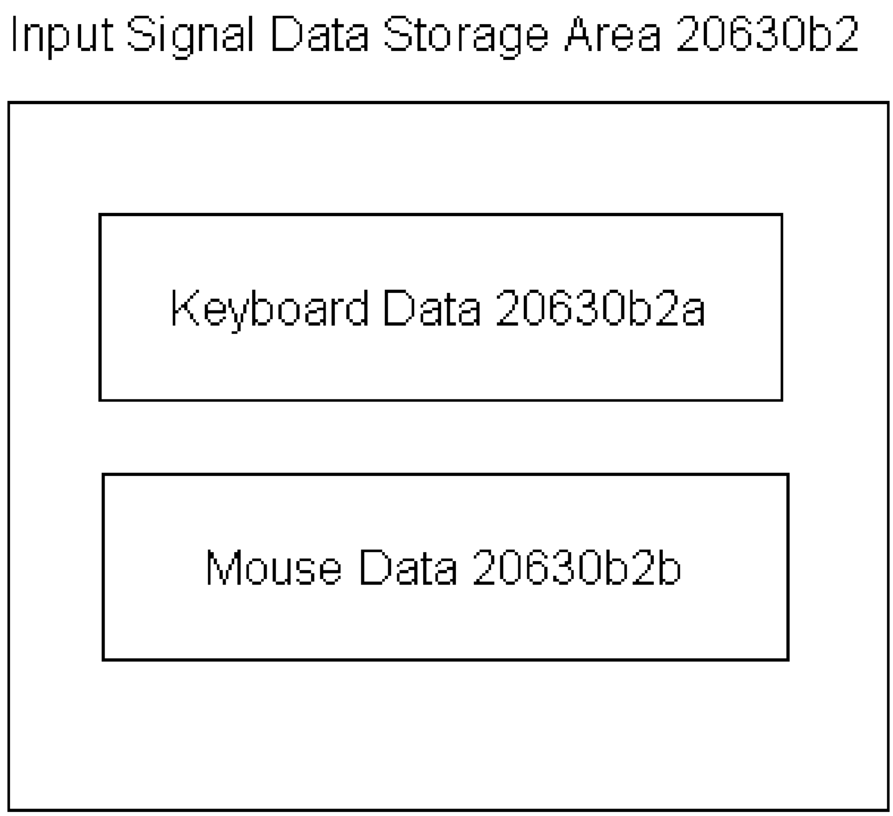

FIG. 656 is a block diagram illustrating an exemplary embodiment of the present invention.

Figure 657:
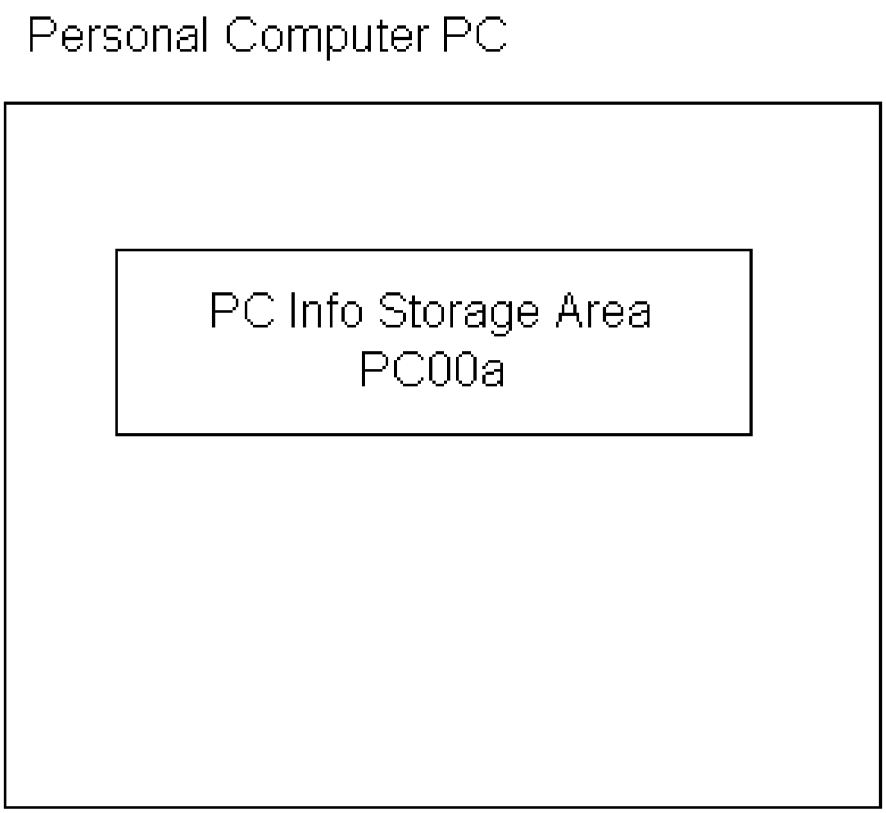

FIG. 657 is a block diagram illustrating an exemplary embodiment of the present invention.

Figure 658:
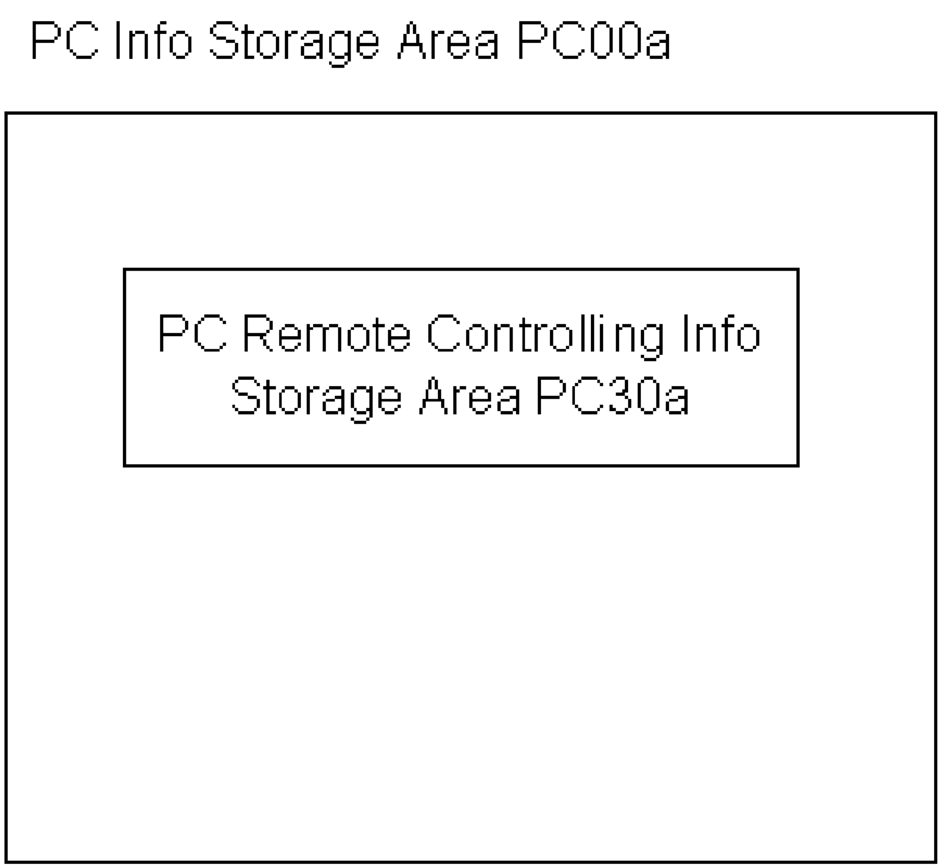

FIG. 658 is a block diagram illustrating an exemplary embodiment of the present invention.

Figure 659:
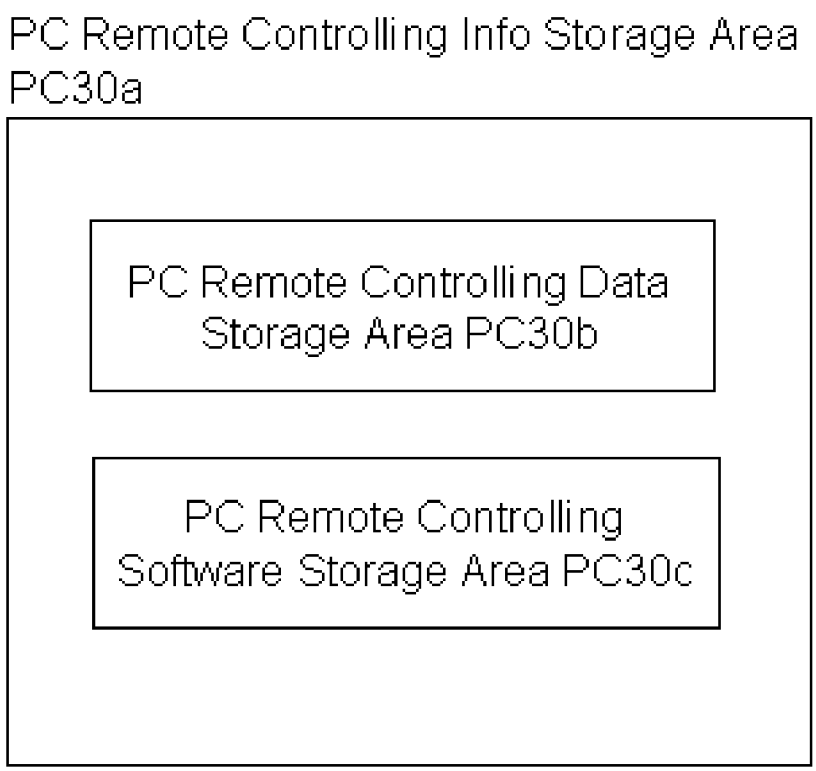

FIG. 659 is a block diagram illustrating an exemplary embodiment of the present invention.

Figure 660:
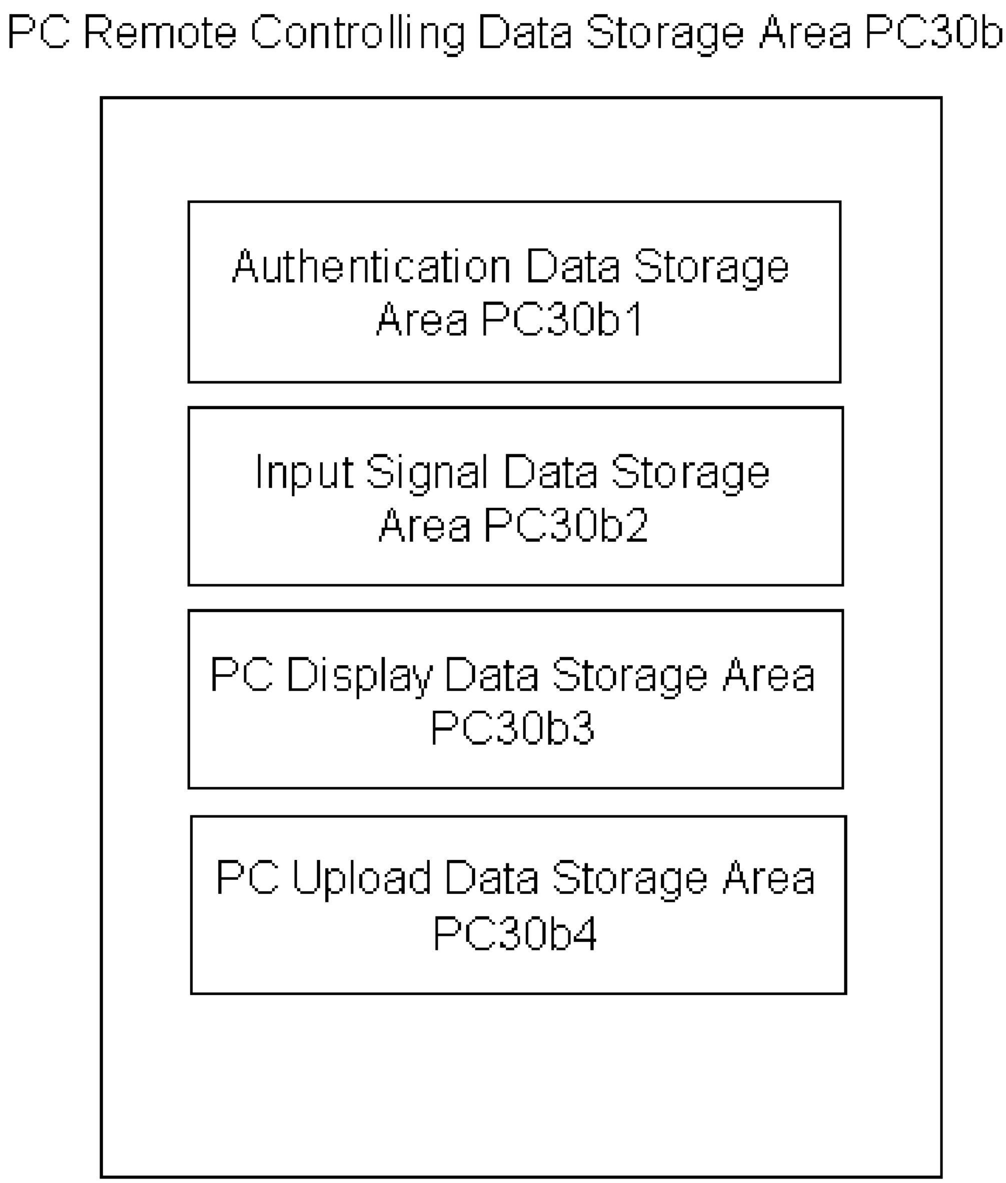

FIG. 660 is a block diagram illustrating an exemplary embodiment of the present invention.

Figure 661:
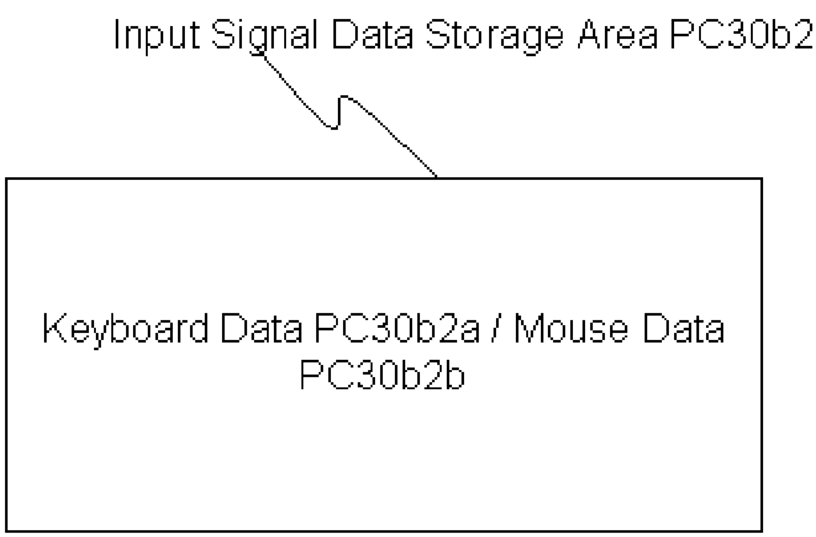

FIG. 661 is a block diagram illustrating an exemplary embodiment of the present invention.

Figure 662:
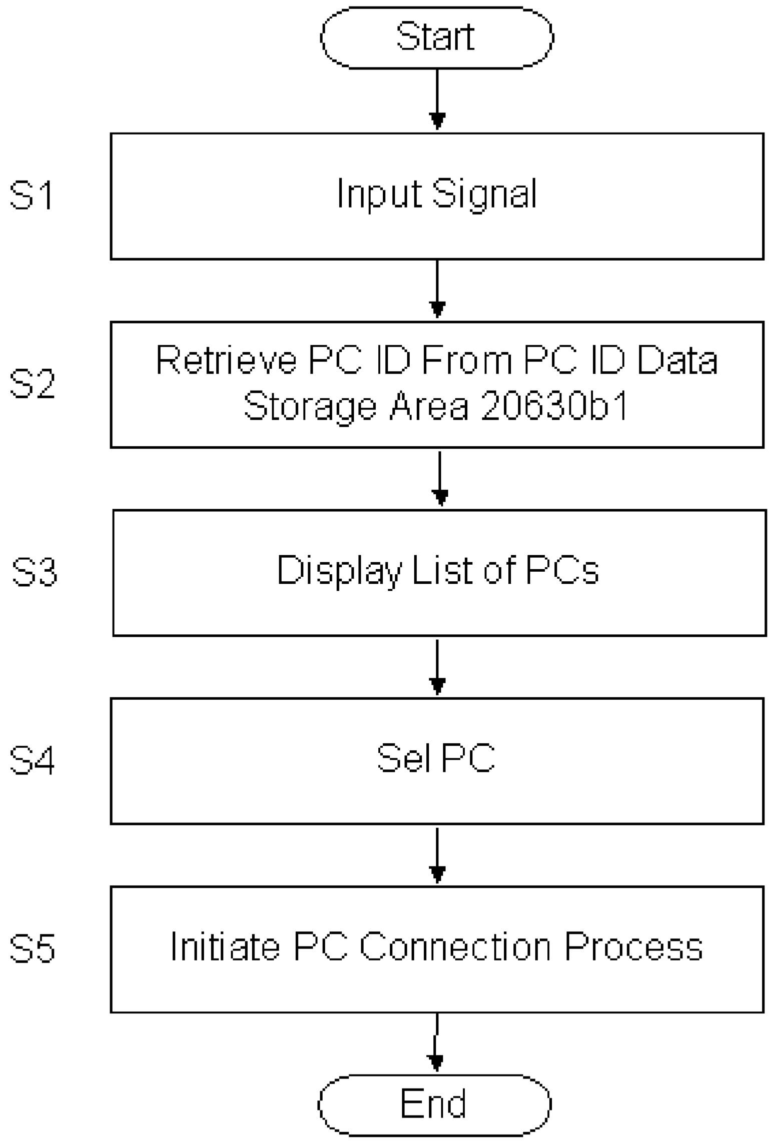

FIG. 662 is a flow chart illustrating an exemplary embodiment of the present invention.

Figure 663:
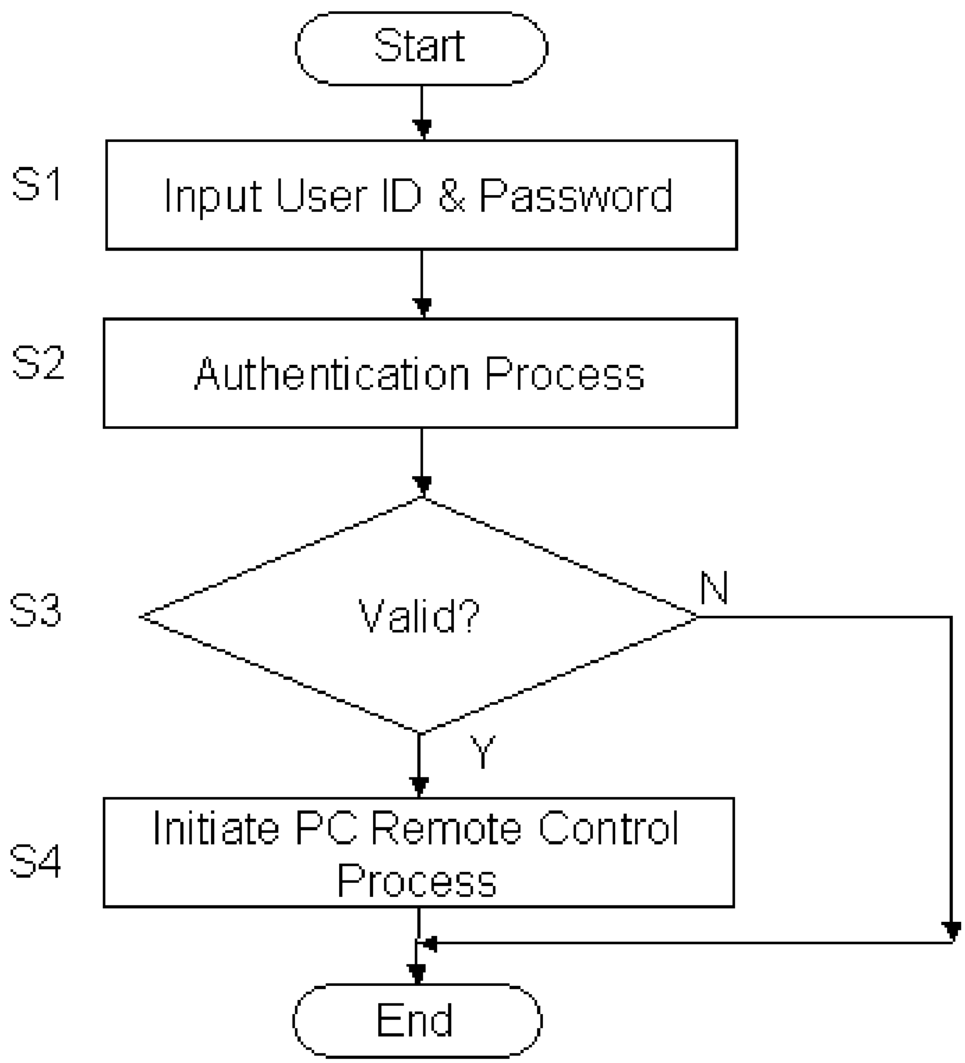

FIG. 663 is a flow chart illustrating an exemplary embodiment of the present invention.

Figure 664:
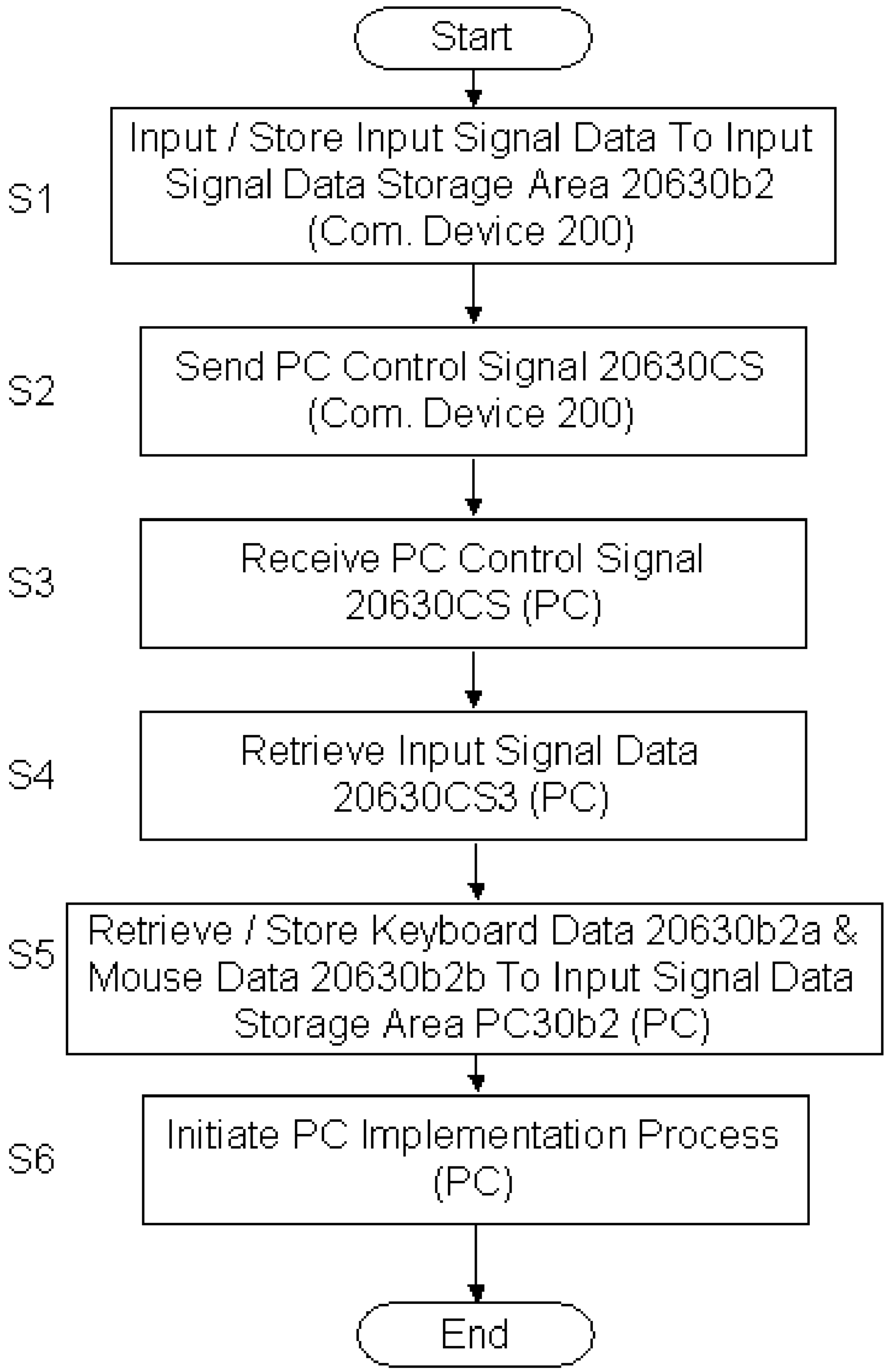

FIG. 664 is a flow chart illustrating an exemplary embodiment of the present invention.

Figure 665:
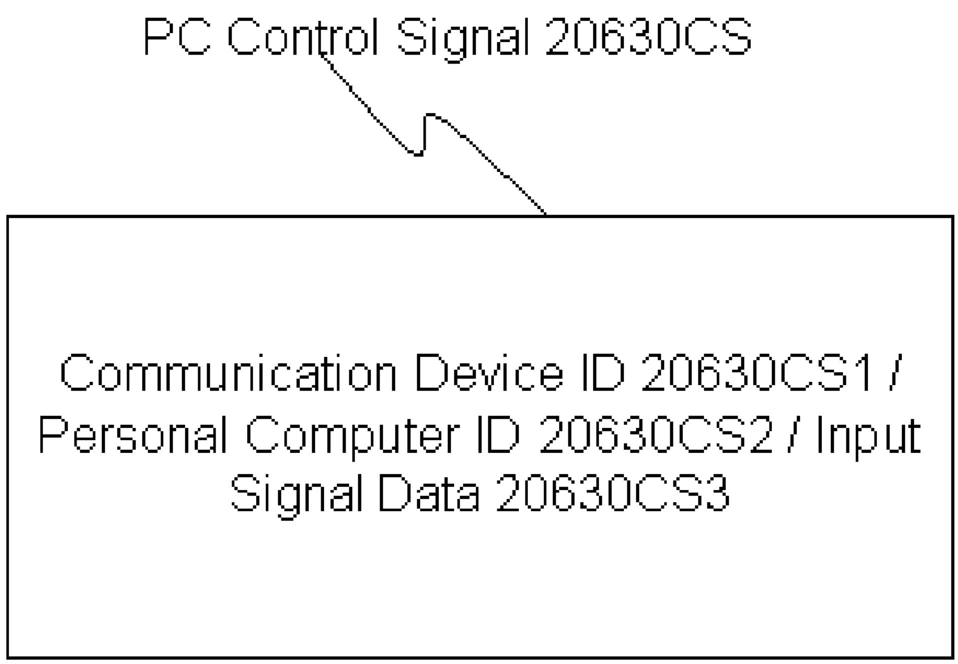

FIG. 665 is a simplified illustration of data utilized in the present invention.

Figure 666:
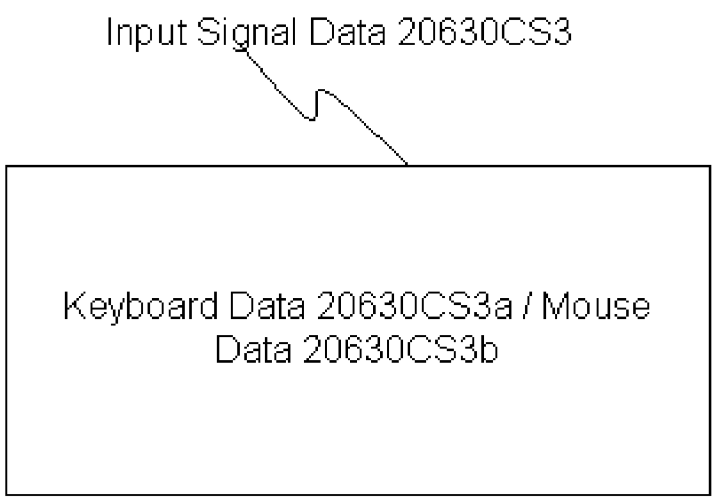

FIG. 666 is a simplified illustration of data utilized in the present invention.

Figure 667:
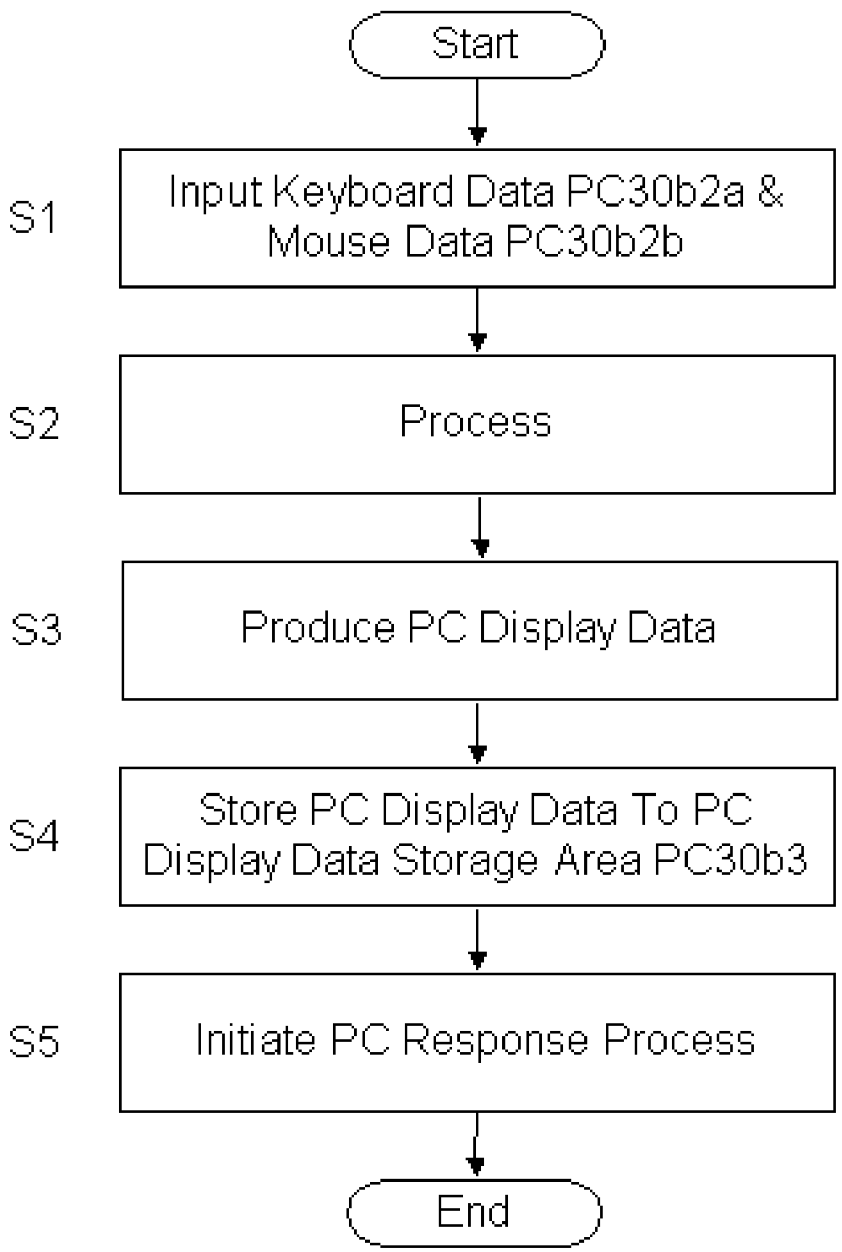

FIG. 667 is a flow chart illustrating an exemplary embodiment of the present invention.

Figure 668:
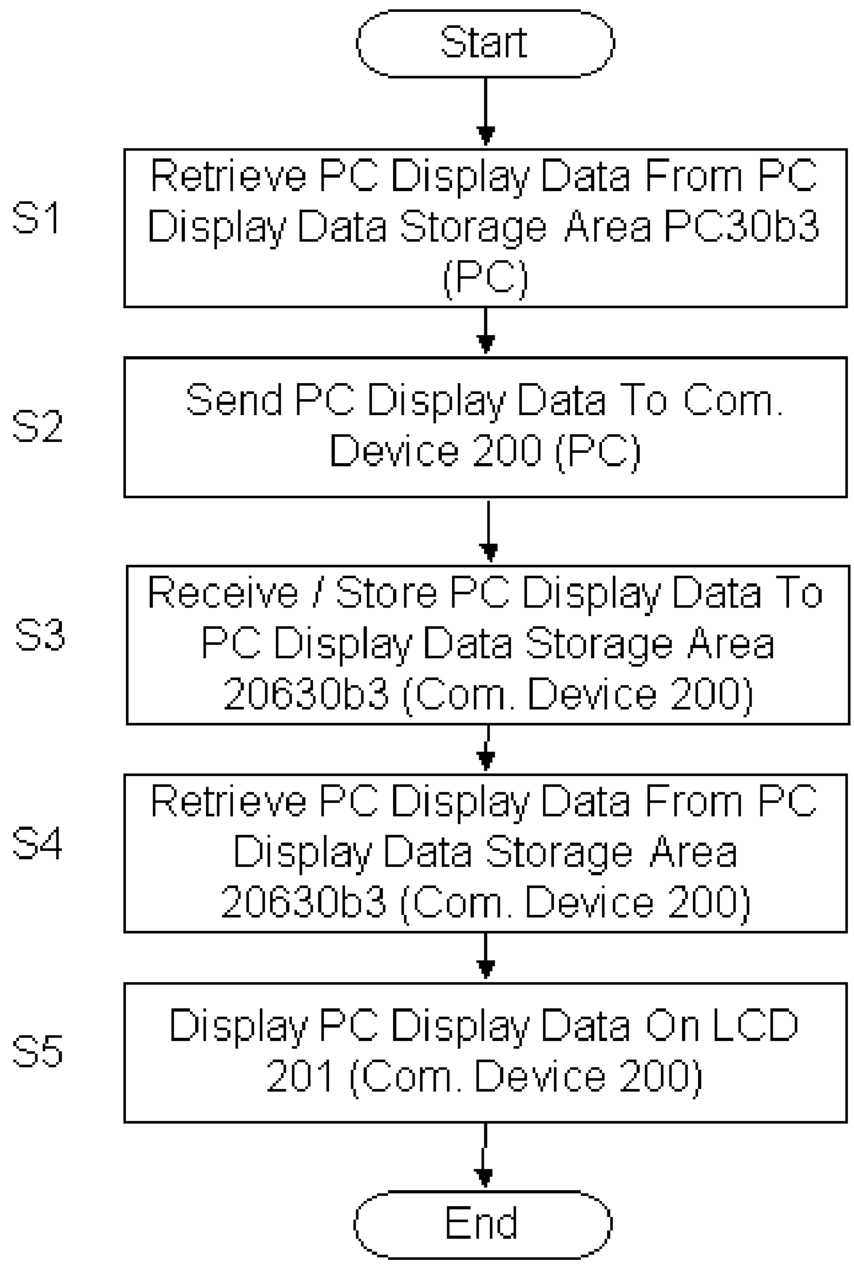

FIG. 668 is a flow chart illustrating an exemplary embodiment of the present invention.

Figure 669:
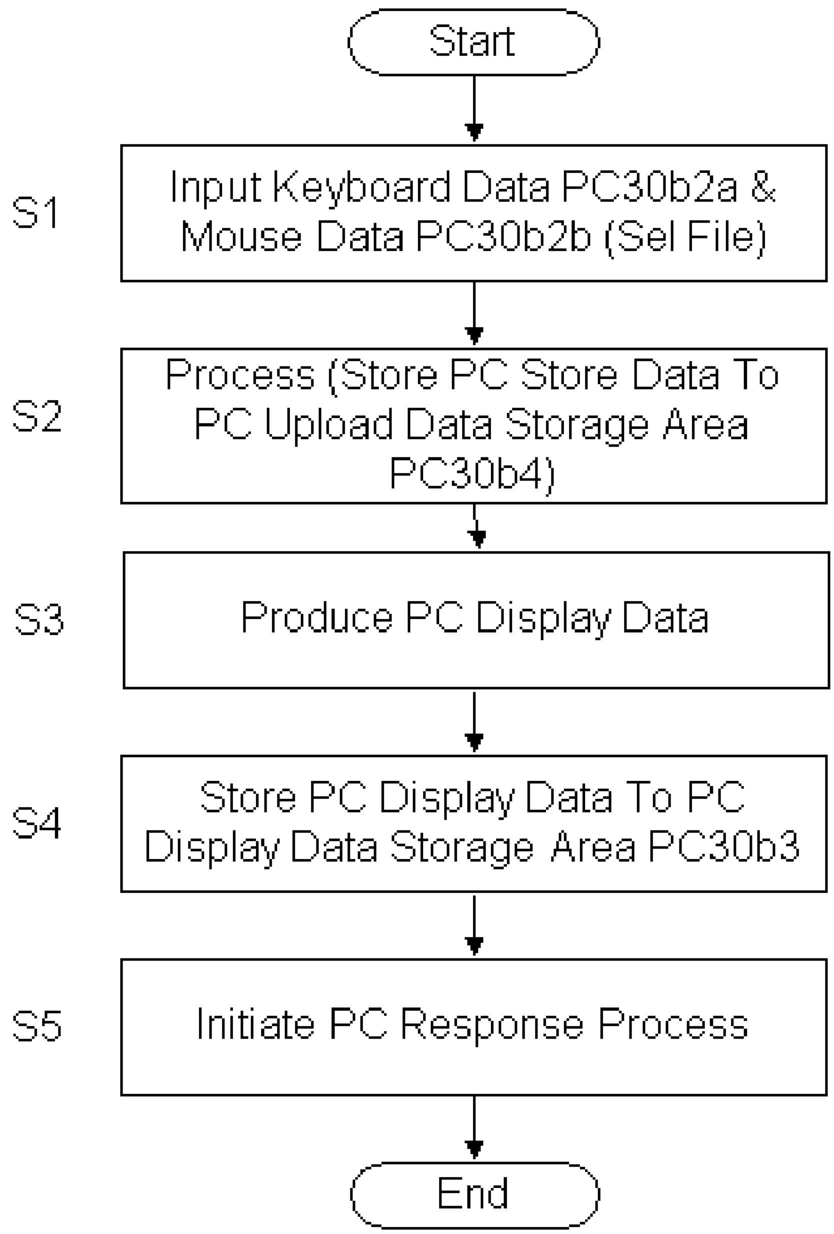

FIG. 669 is a flow chart illustrating an exemplary embodiment of the present invention.

Figure 670:
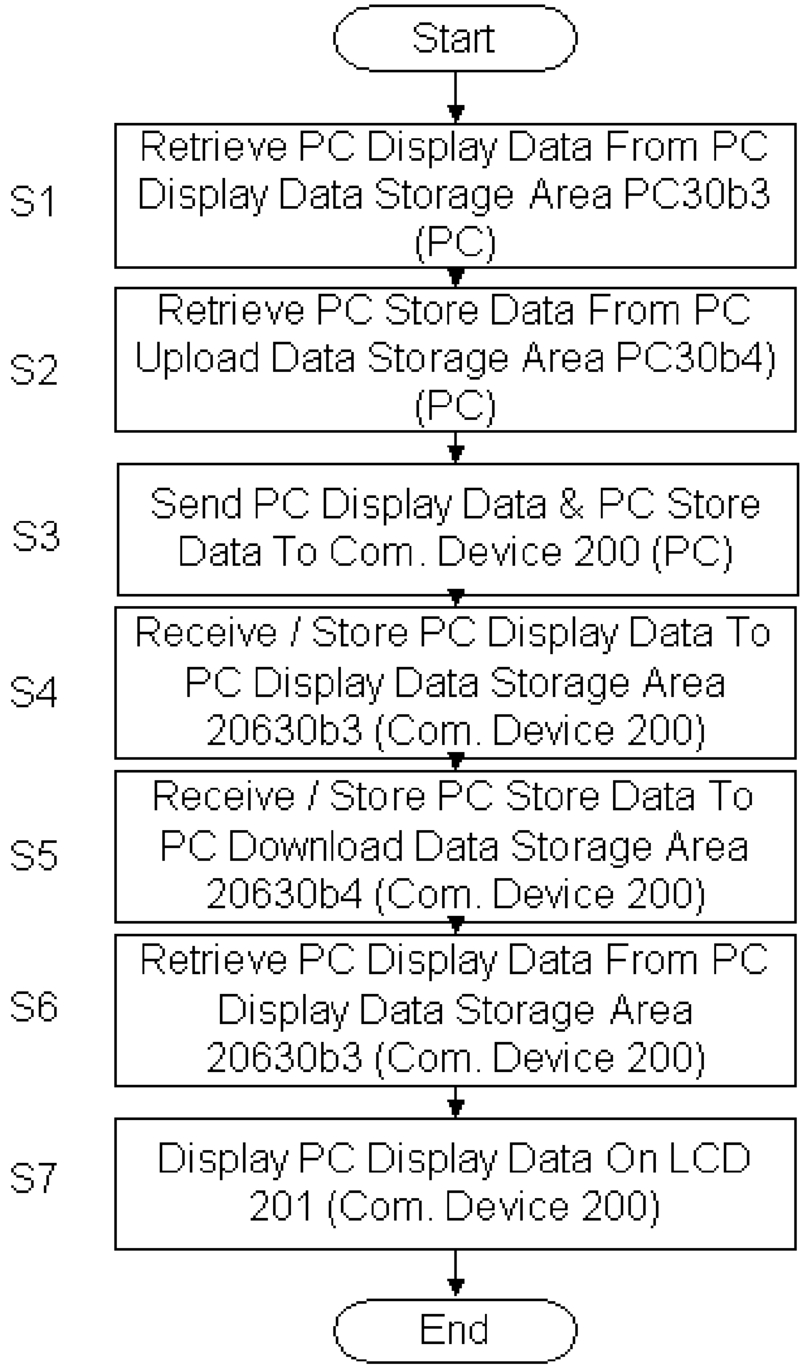

FIG. 670 is a flow chart illustrating an exemplary embodiment of the present invention.

Figure 671:
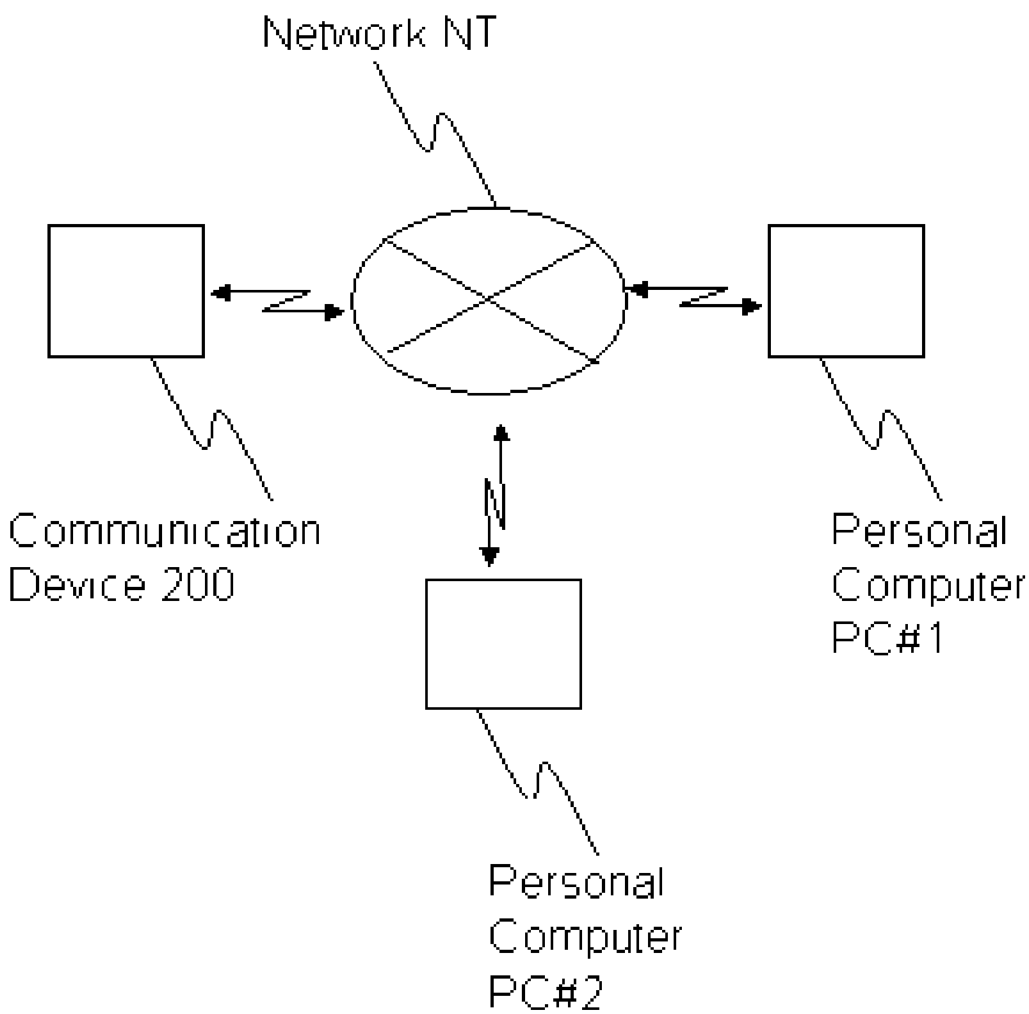

FIG. 671 is a simplified illustration illustrating an exemplary embodiment of the present invention.

Figure 672:
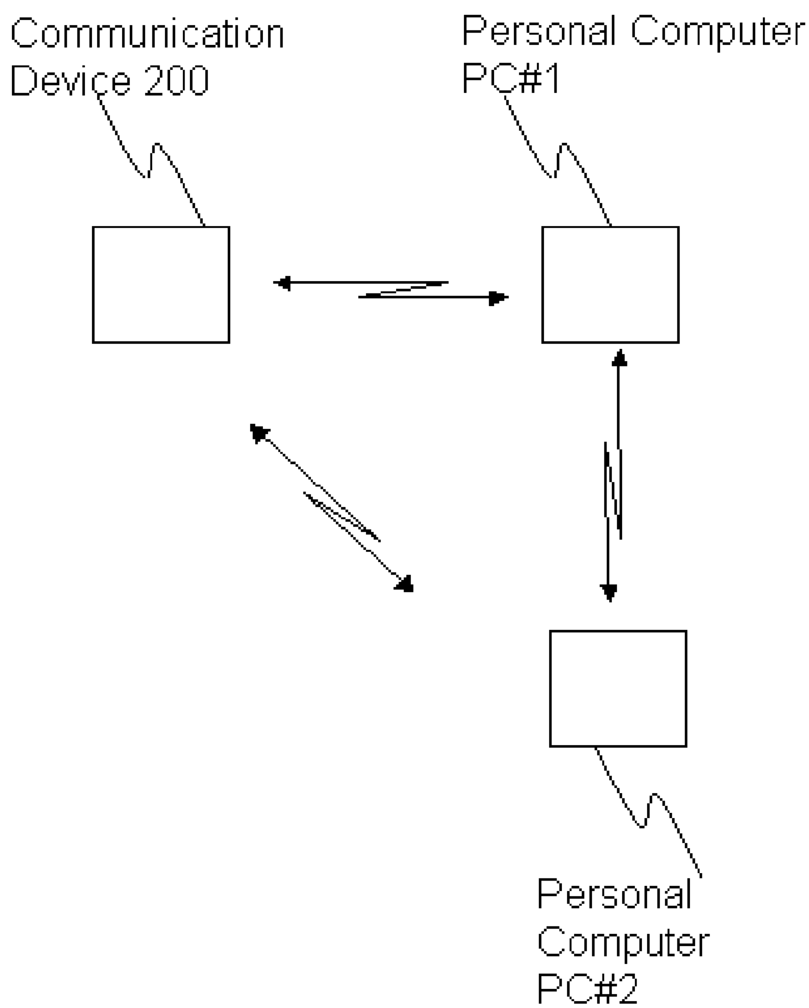

FIG. 672 is a simplified illustration illustrating an exemplary embodiment of the present invention.

Figure 673:
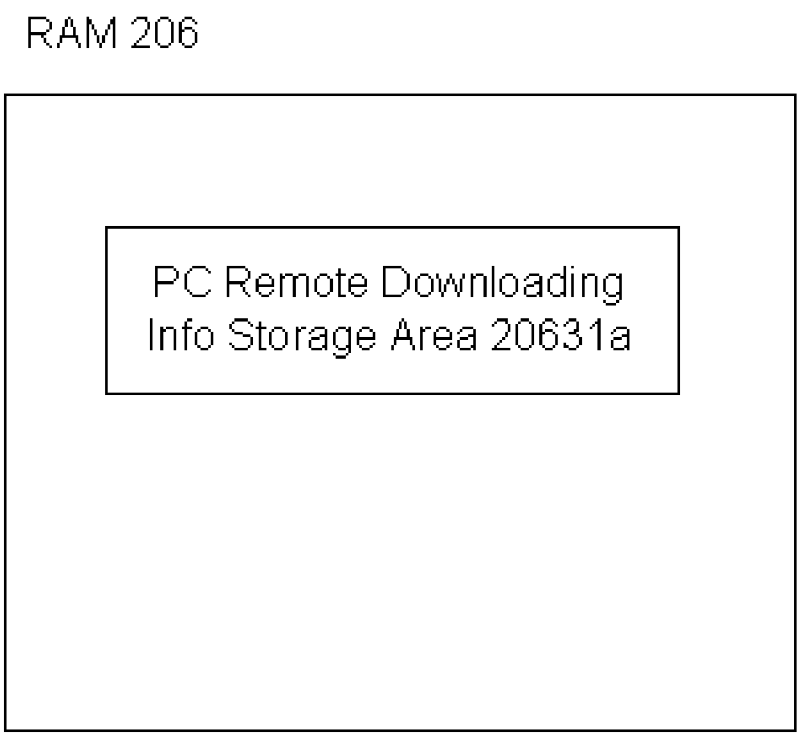

FIG. 673 is a block diagram illustrating an exemplary embodiment of the present invention.

Figure 674:
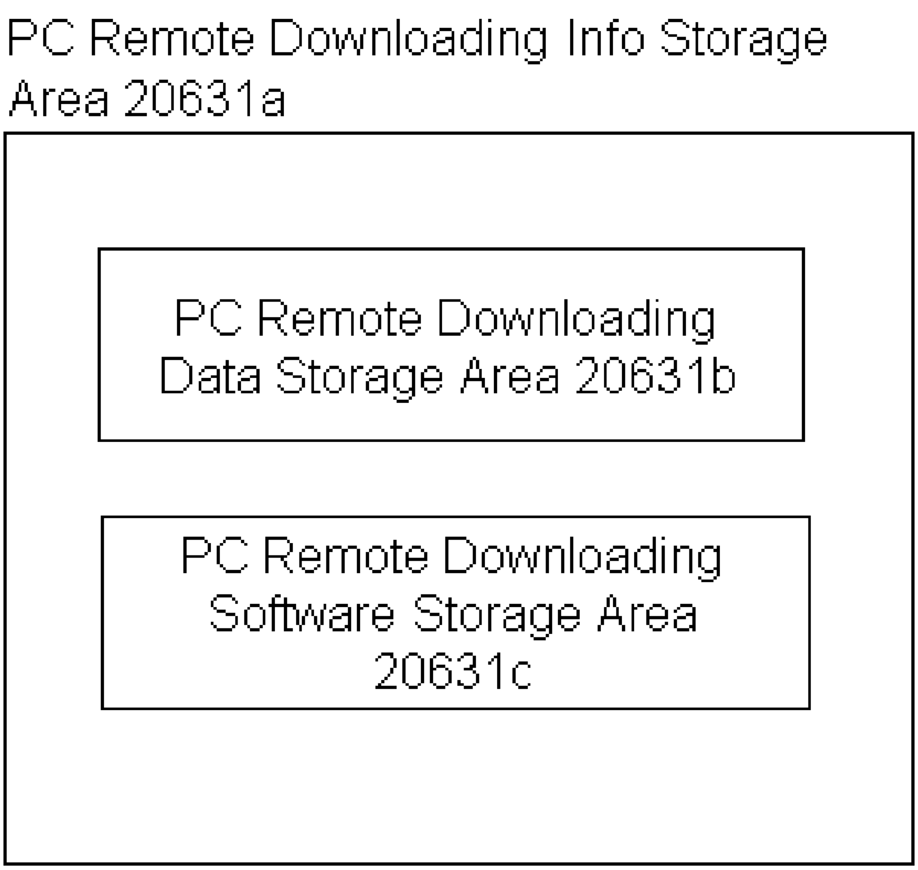

FIG. 674 is a block diagram illustrating an exemplary embodiment of the present invention.

Figure 675:
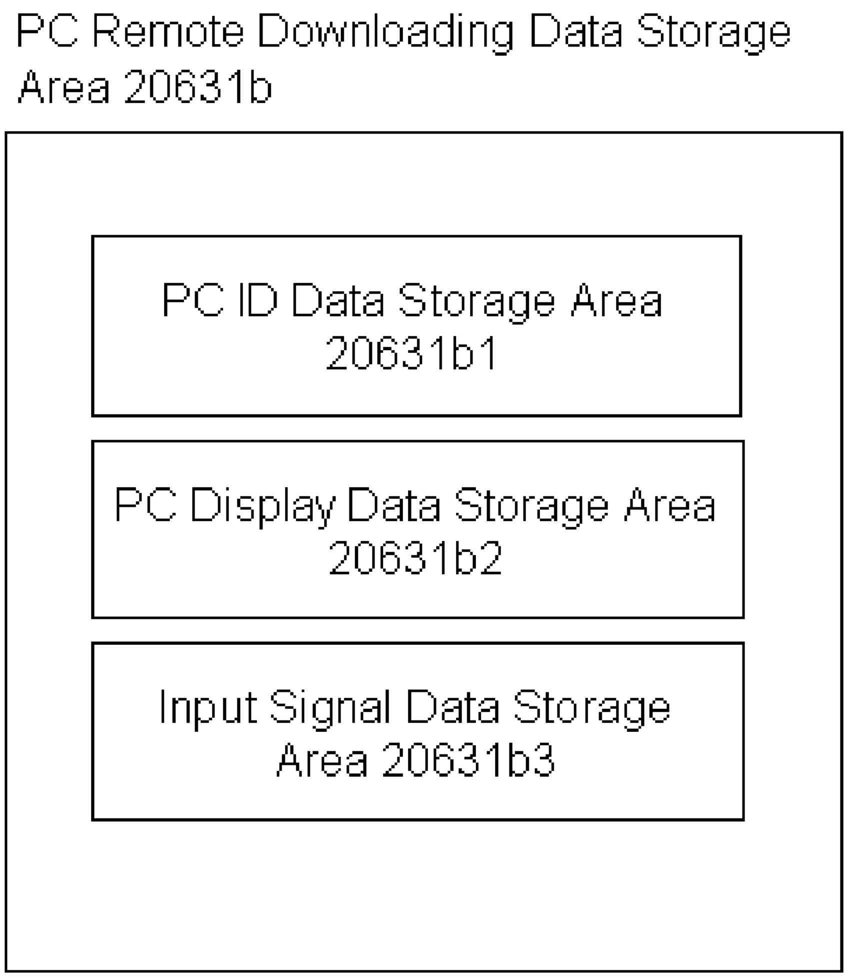

FIG. 675 is a block diagram illustrating an exemplary embodiment of the present invention.

Figure 676:
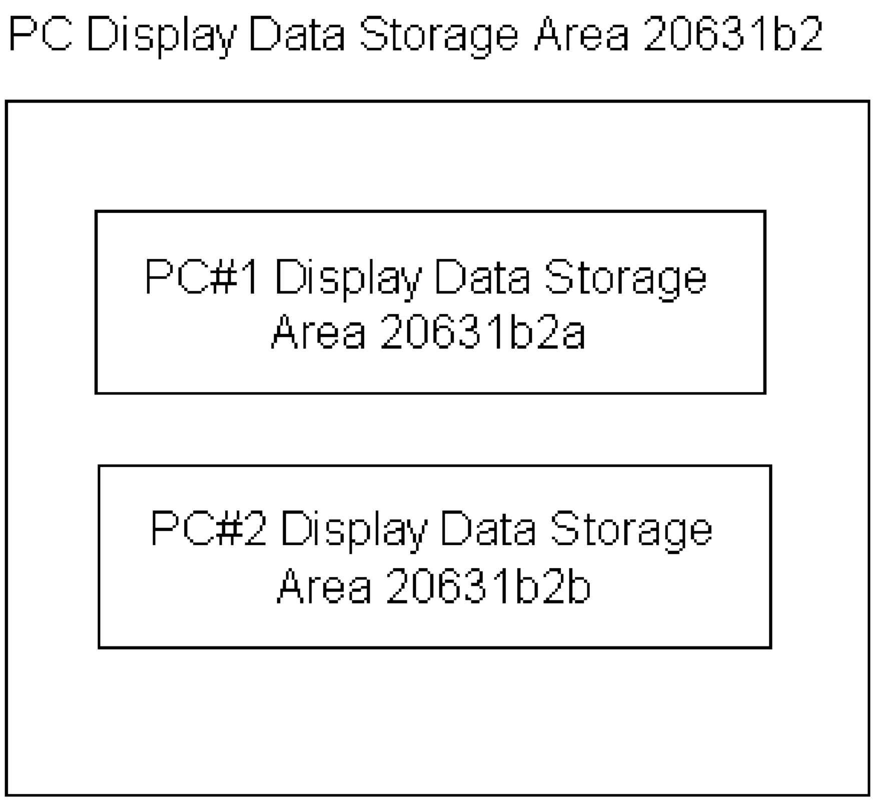

FIG. 676 is a block diagram illustrating an exemplary embodiment of the present invention.

Figure 677:
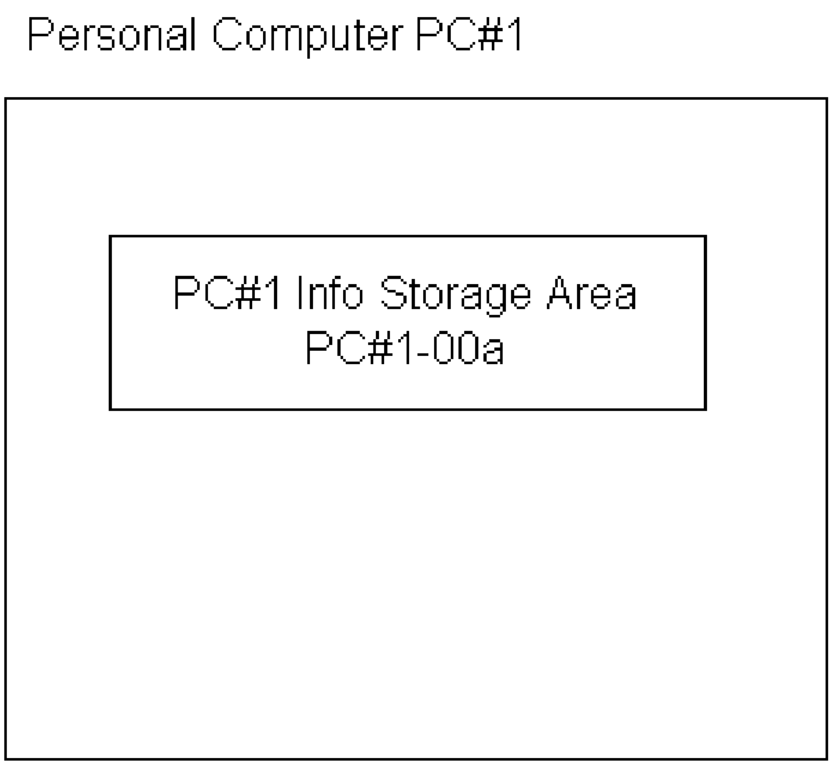

FIG. 677 is a block diagram illustrating an exemplary embodiment of the present invention.

Figure 678:
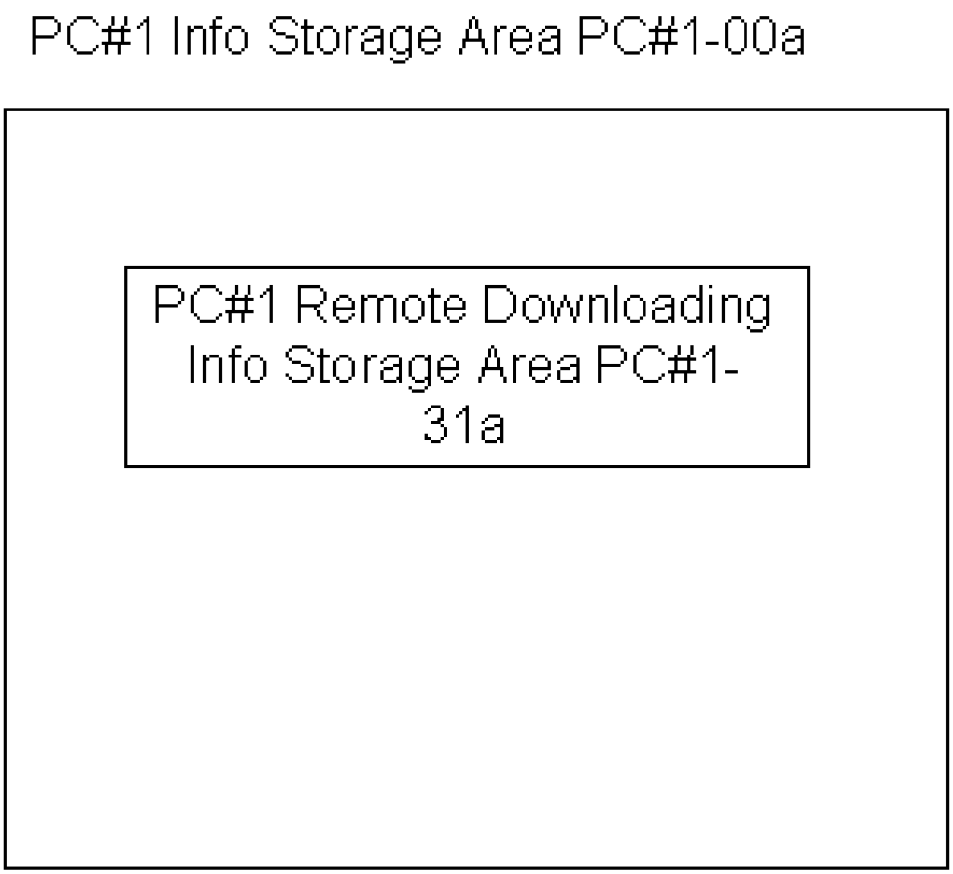

FIG. 678 is a block diagram illustrating an exemplary embodiment of the present invention.

Figure 679:
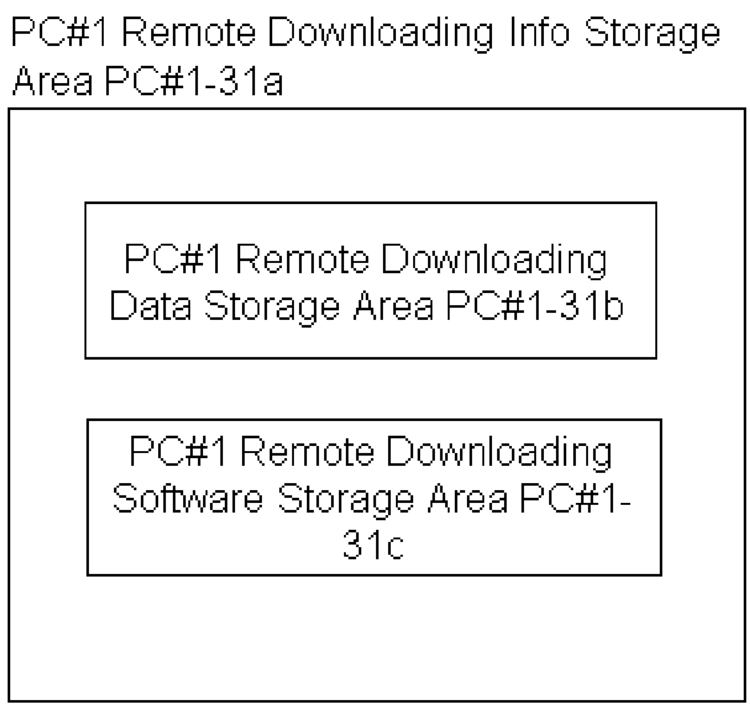

FIG. 679 is a block diagram illustrating an exemplary embodiment of the present invention.

Figure 680:
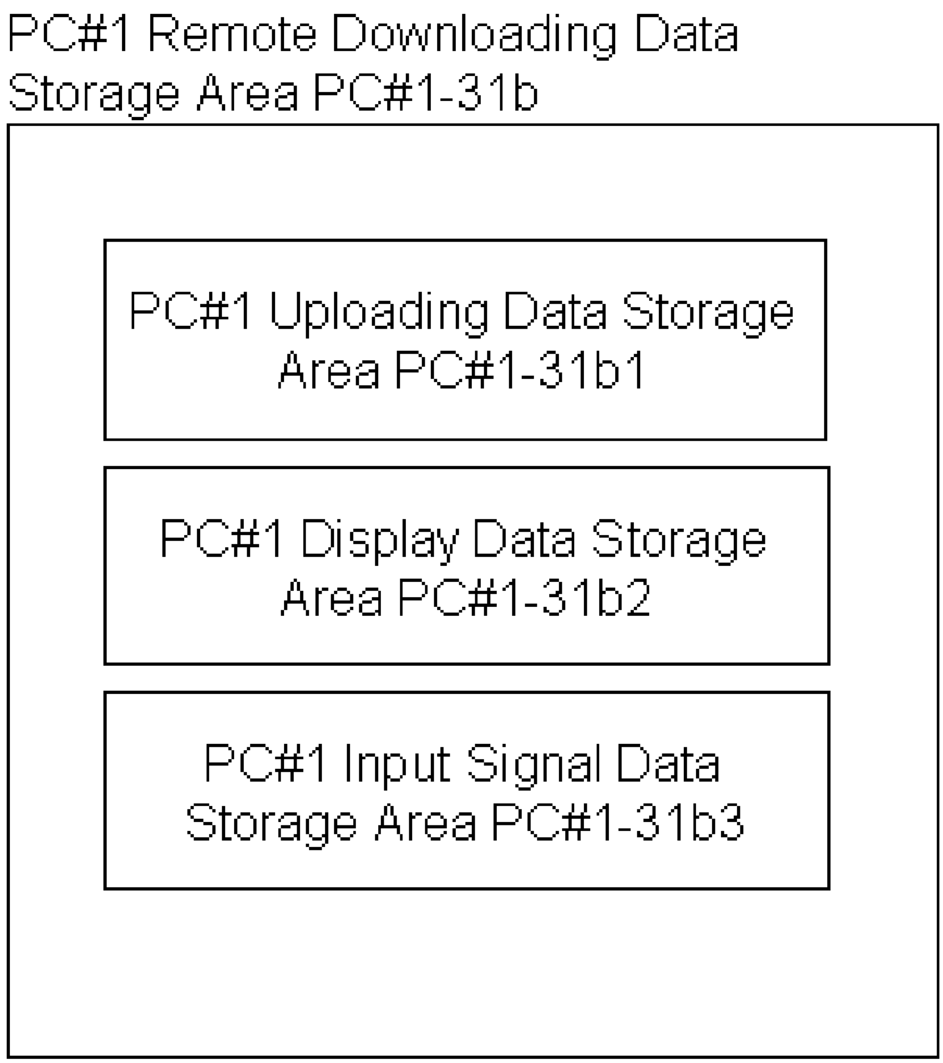

FIG. 680 is a block diagram illustrating an exemplary embodiment of the present invention.

Figure 681:
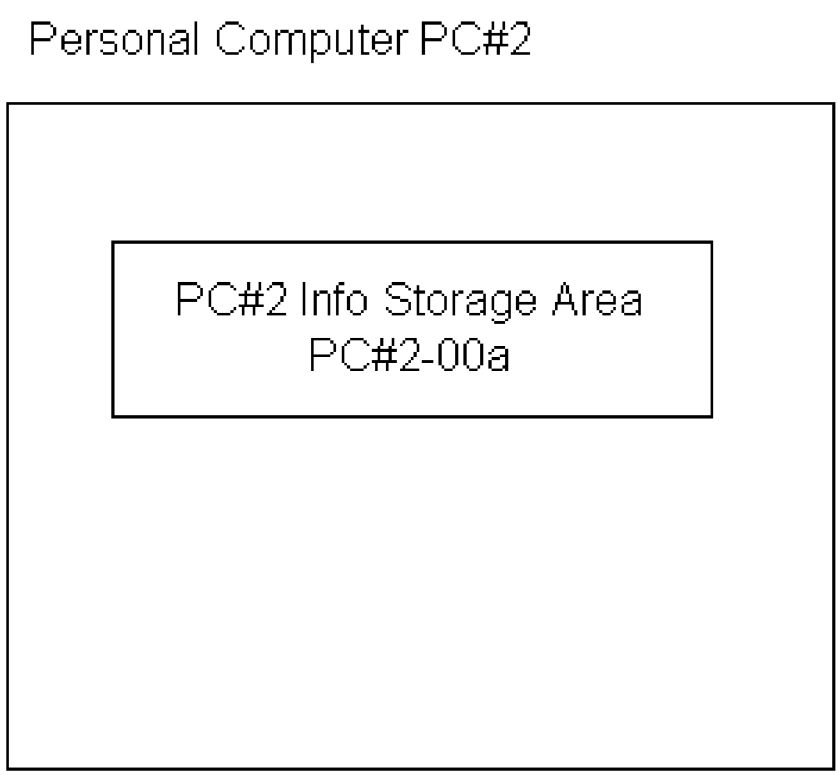

FIG. 681 is a block diagram illustrating an exemplary embodiment of the present invention.

Figure 682:
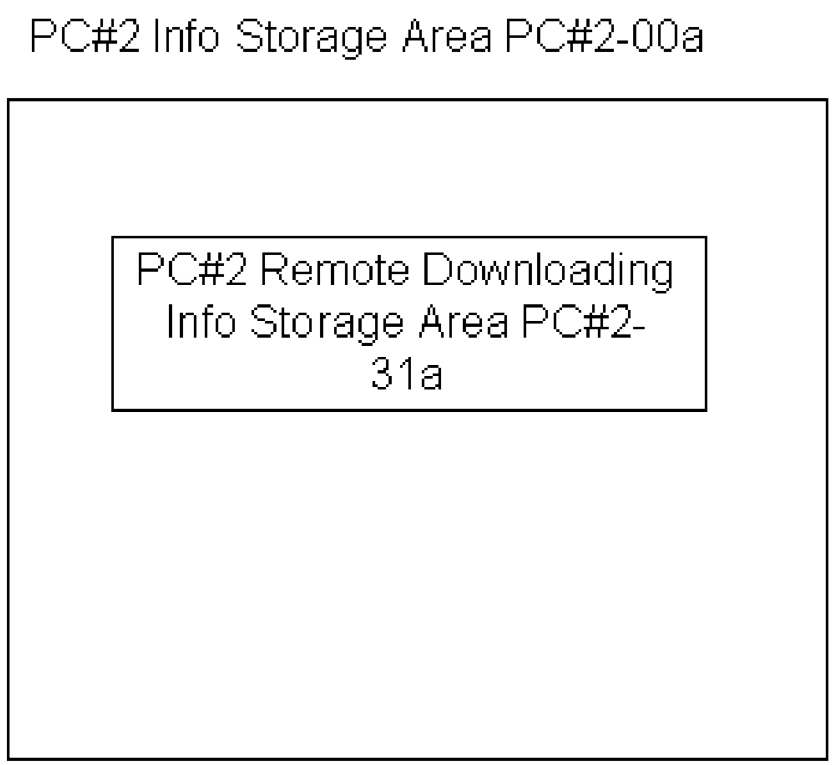

FIG. 682 is a block diagram illustrating an exemplary embodiment of the present invention.

Figure 683:
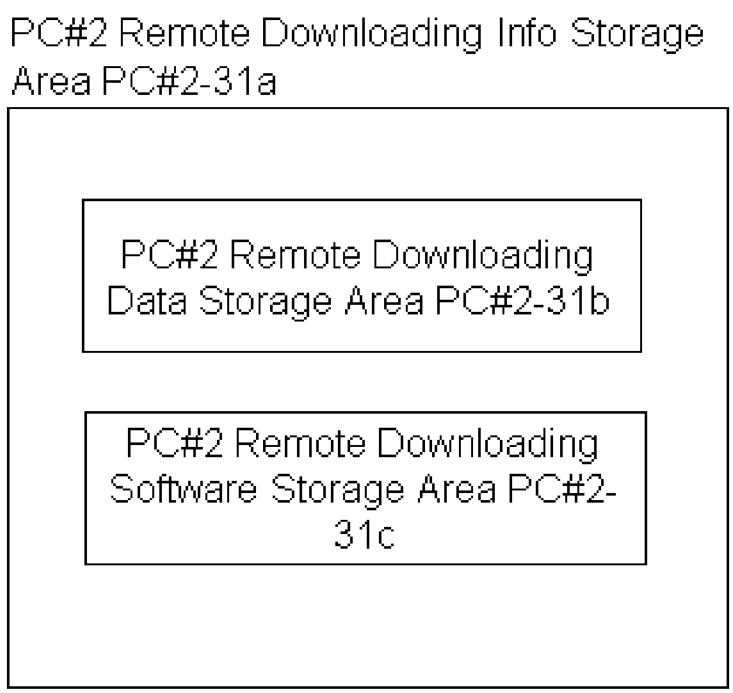

FIG. 683 is a block diagram illustrating an exemplary embodiment of the present invention.

Figure 684:
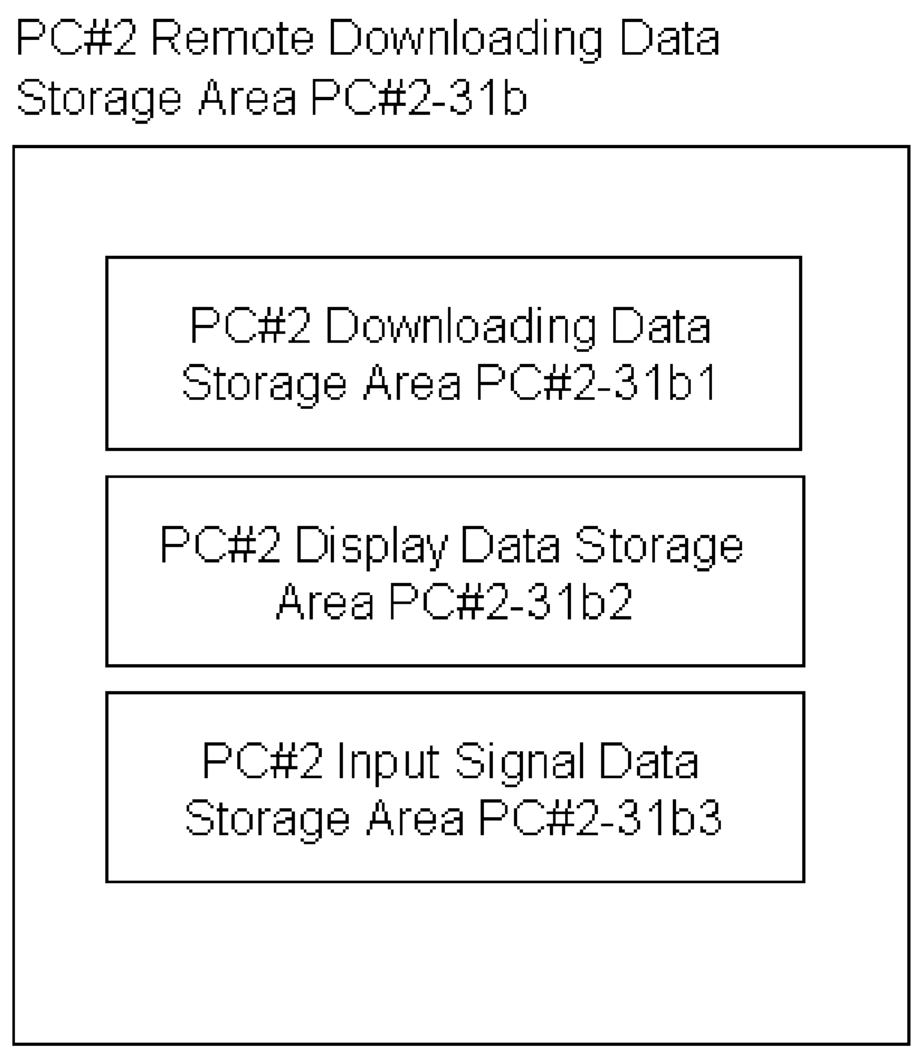

FIG. 684 is a block diagram illustrating an exemplary embodiment of the present invention.

Figure 685:
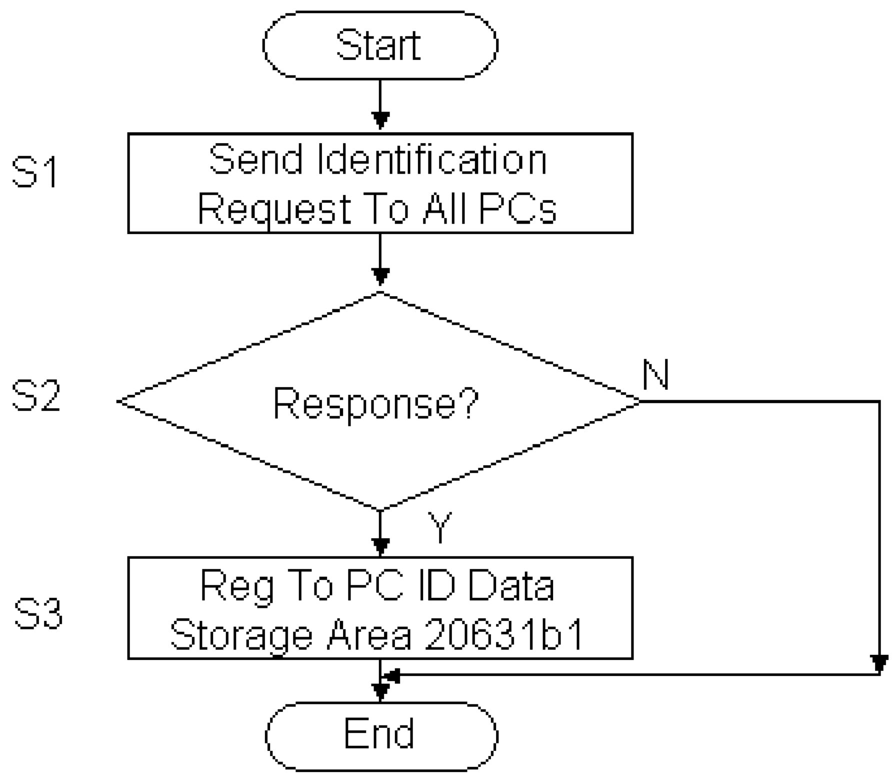

FIG. 685 is a flowchart illustrating an exemplary embodiment of the present invention.

Figure 686:
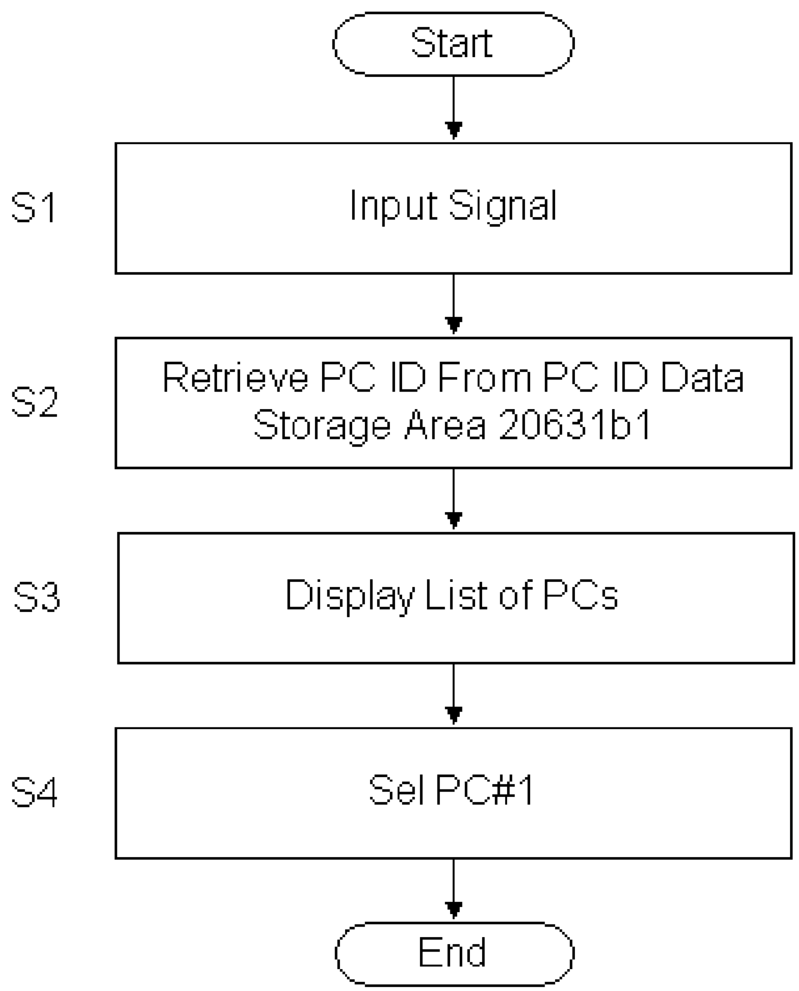

FIG. 686 is a flowchart illustrating an exemplary embodiment of the present invention.

Figure 687:
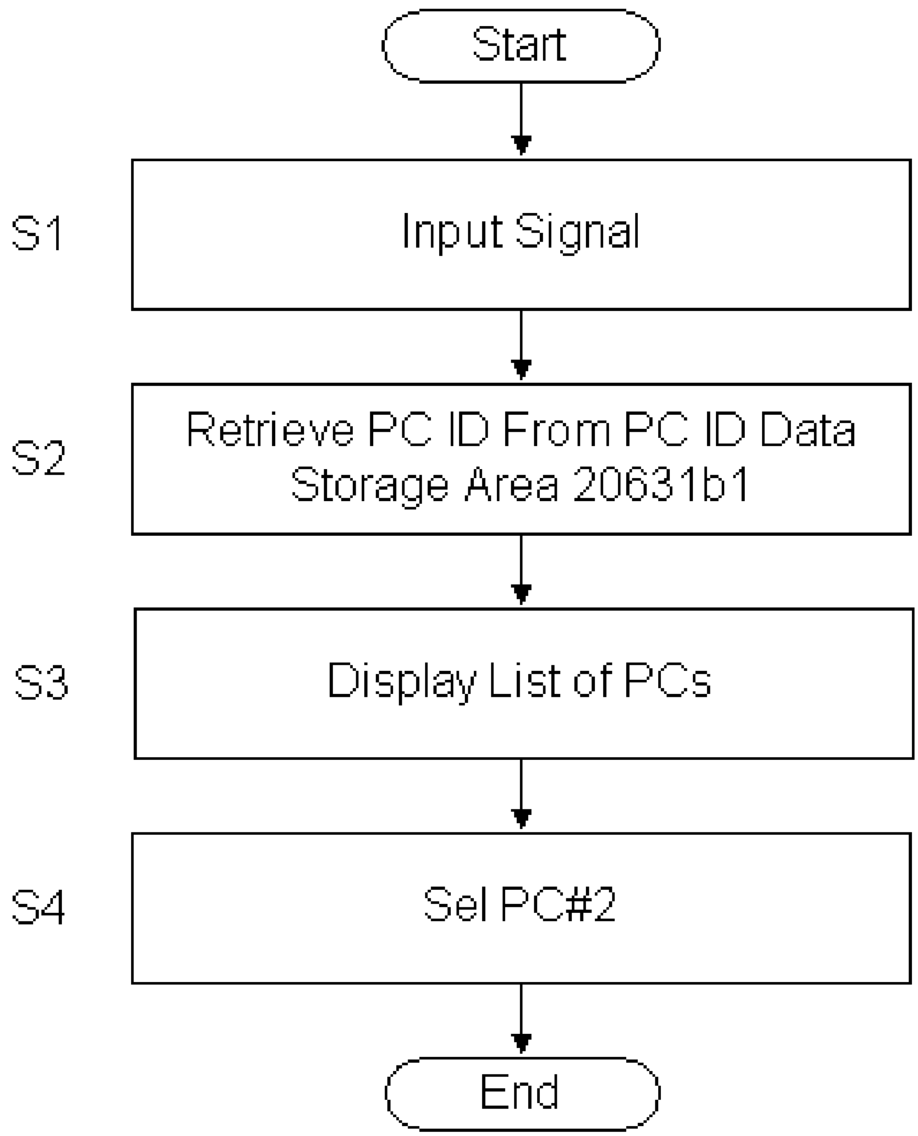

FIG. 687 is a flowchart illustrating an exemplary embodiment of the present invention.

Figure 688:
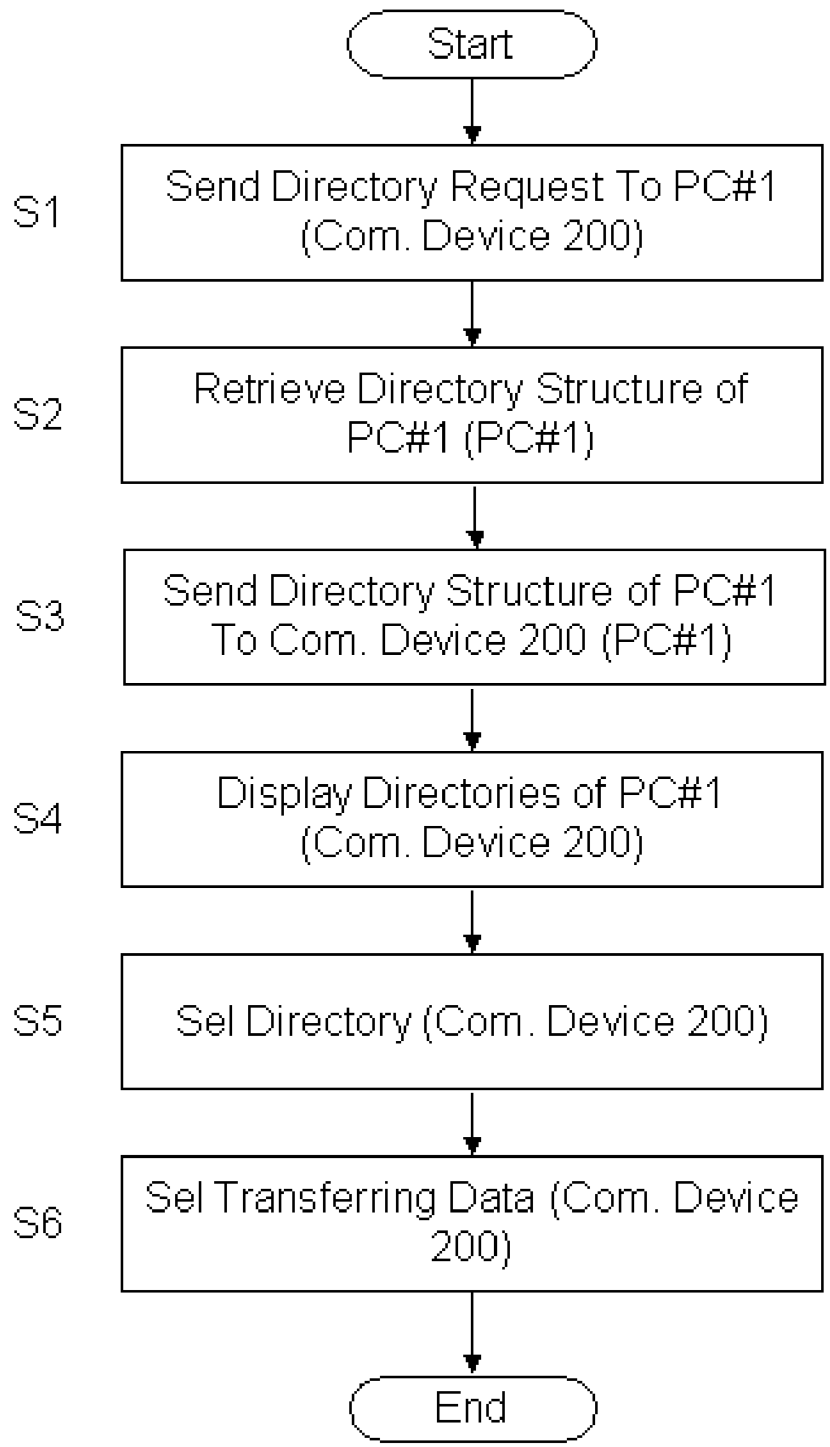

FIG. 688 is a flowchart illustrating an exemplary embodiment of the present invention.

Figure 689:
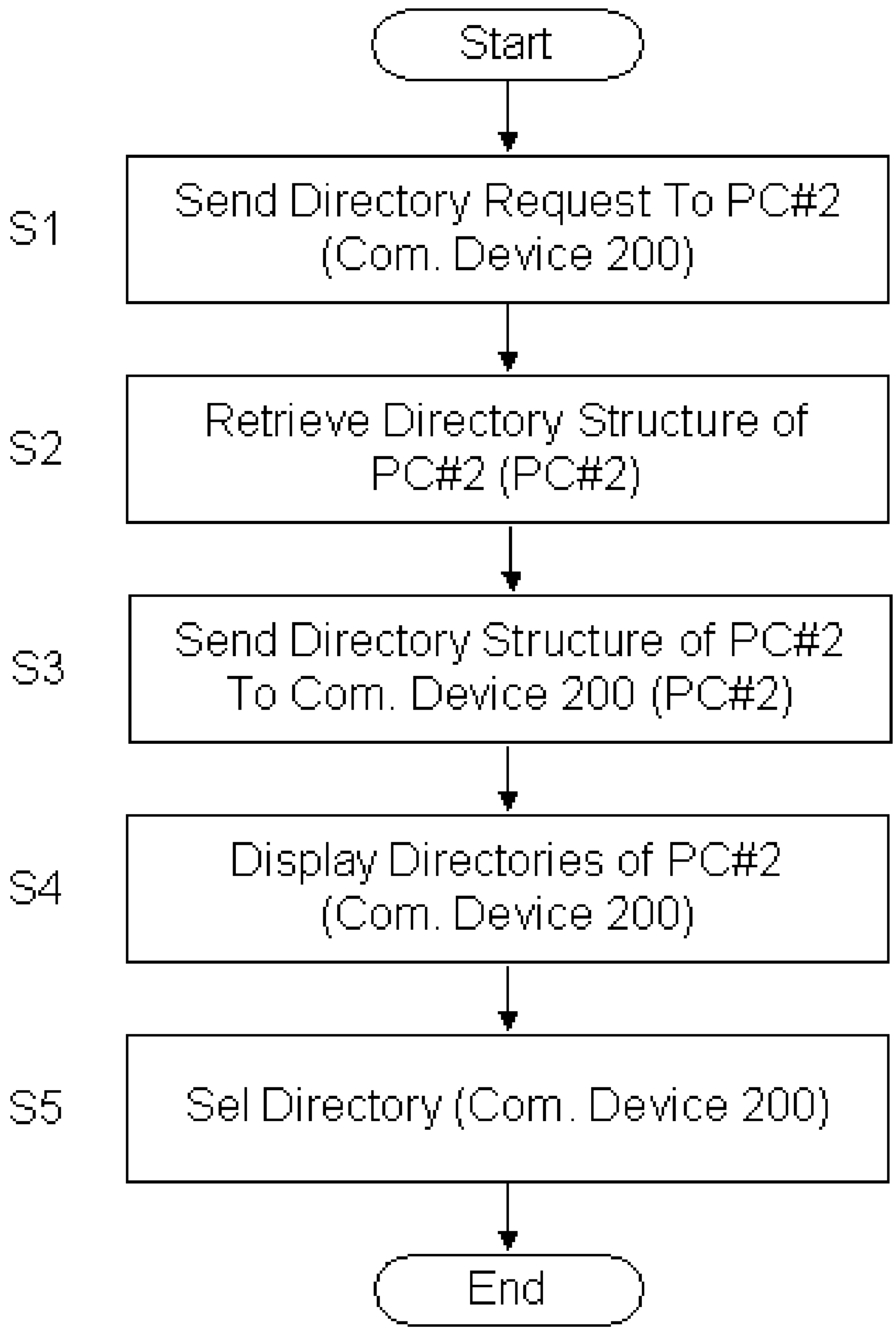

FIG. 689 is a flowchart illustrating an exemplary embodiment of the present invention.

Figure 690:
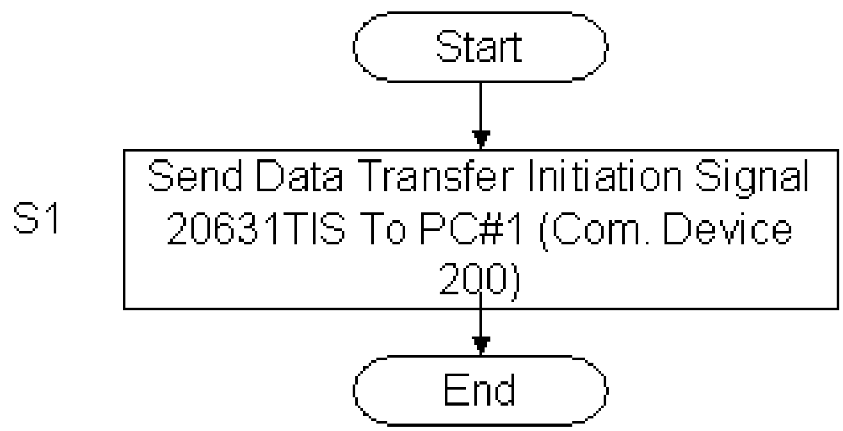

FIG. 690 is a flowchart illustrating an exemplary embodiment of the present invention.

FIG. 691 is a simplified illustration of data utilized in the present invention.

Figure 692:
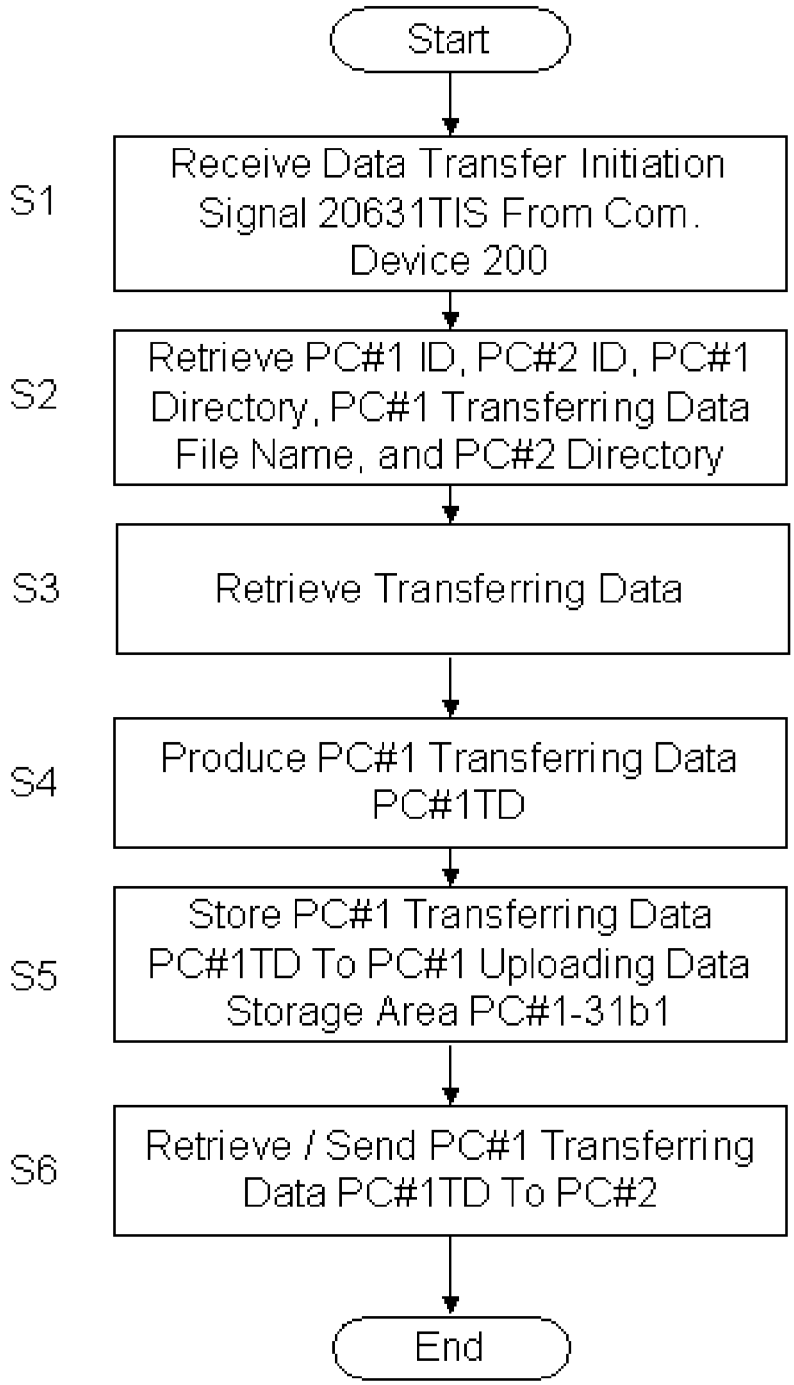

FIG. 692 is a flowchart illustrating an exemplary embodiment of the present invention.

FIG. 692*a* is a simplified illustration of data utilized in the present invention.

Figure 693:
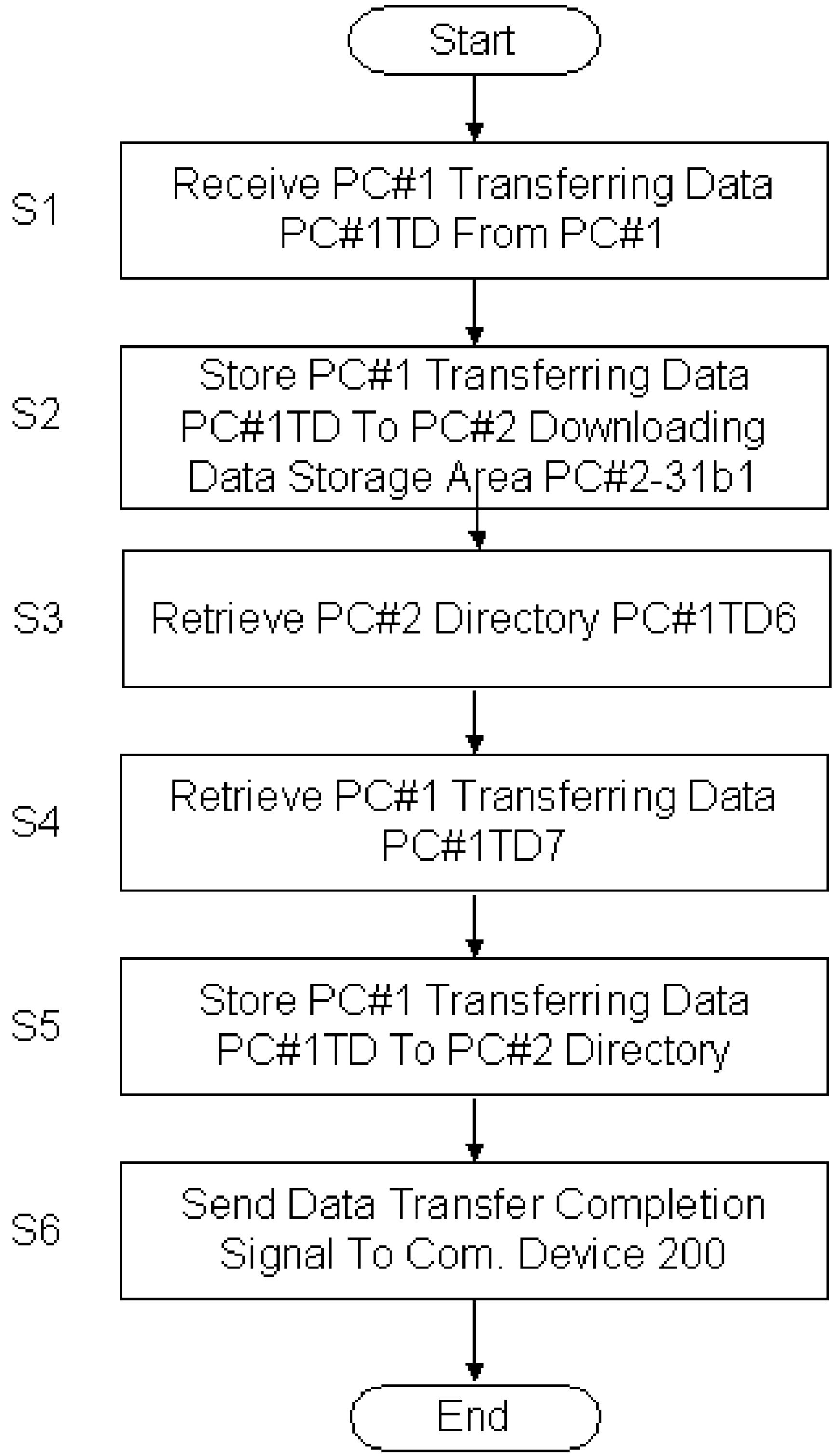

FIG. 693 is a flowchart illustrating an exemplary embodiment of the present invention.

Figure 694:
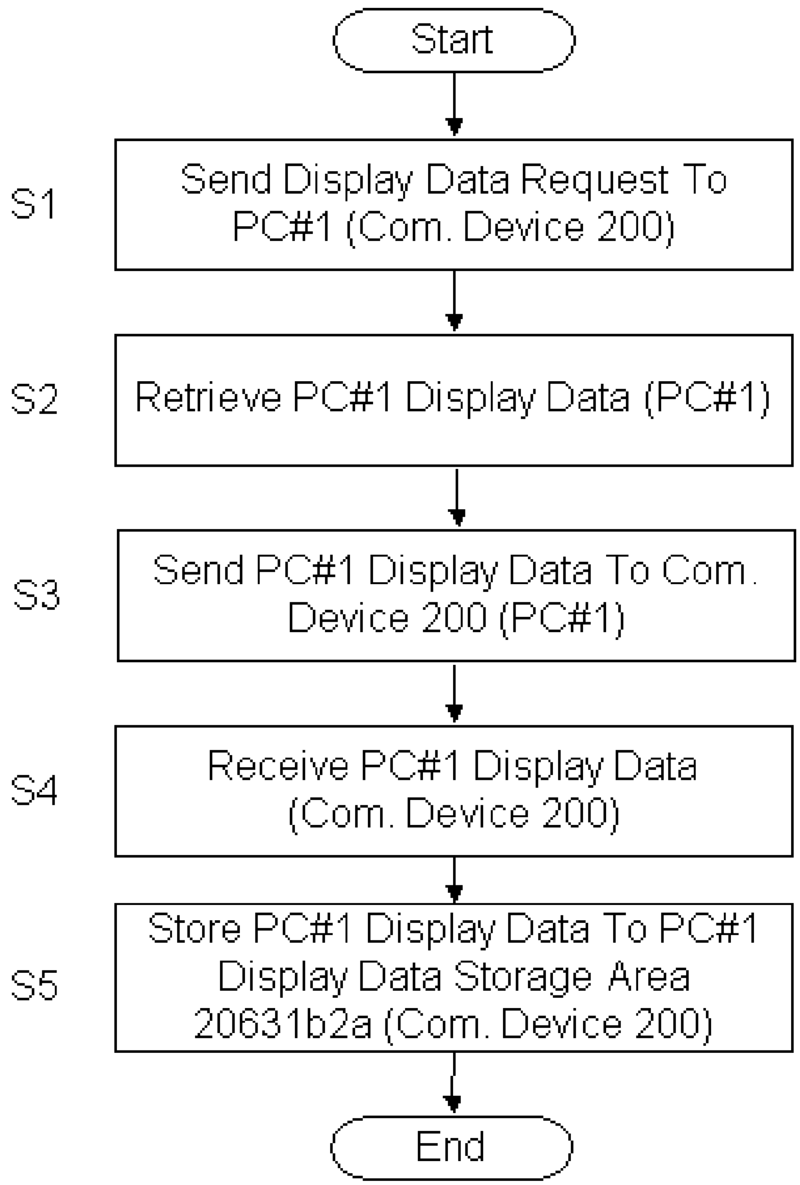

FIG. 694 is a flowchart illustrating an exemplary embodiment of the present invention.

Figure 695:
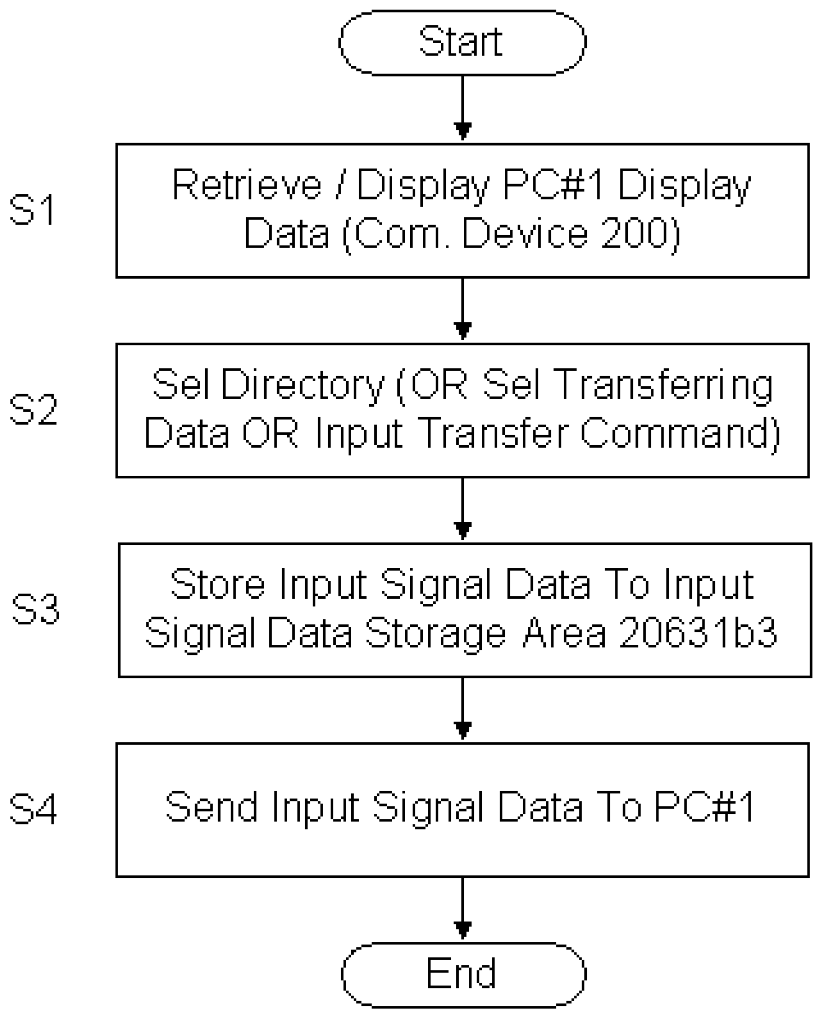

FIG. 695 is a flowchart illustrating an exemplary embodiment of the present invention.

Figure 696:
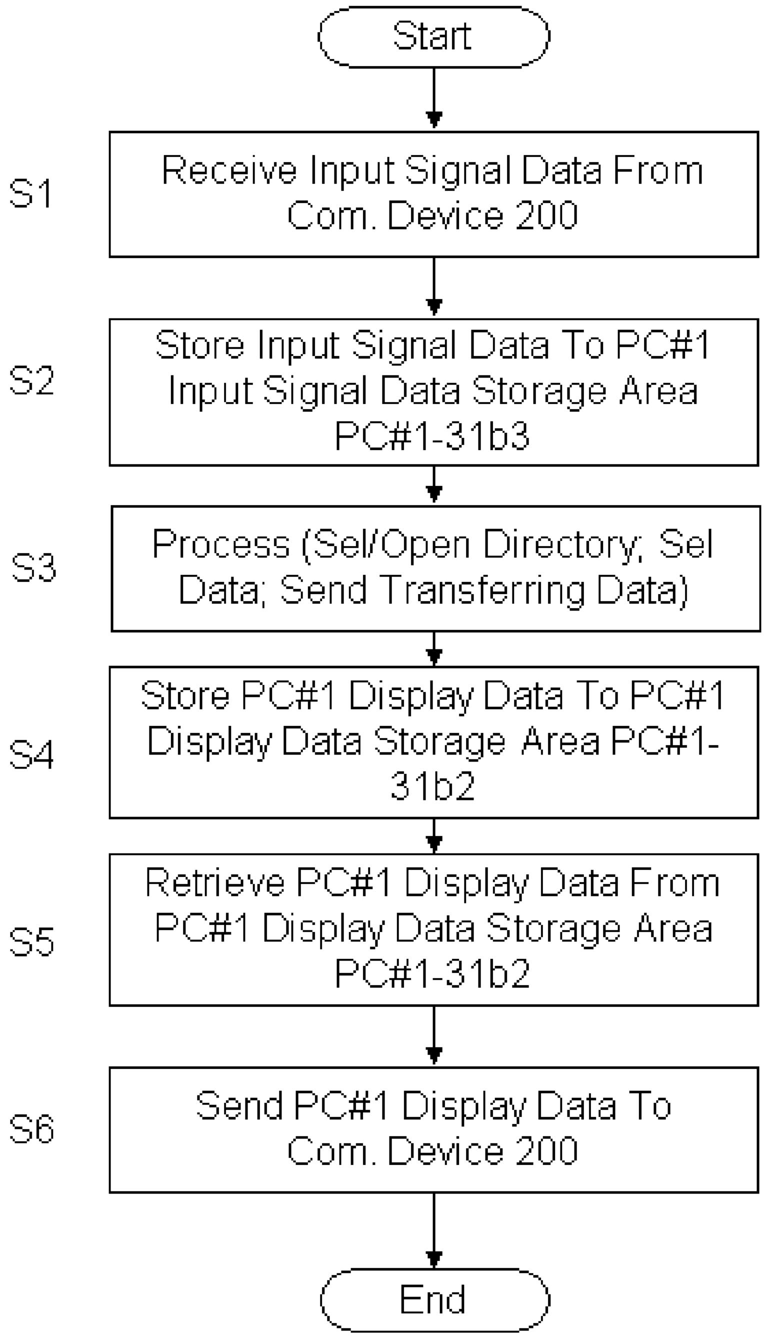

FIG. 696 is a flowchart illustrating an exemplary embodiment of the present invention.

Figure 697:
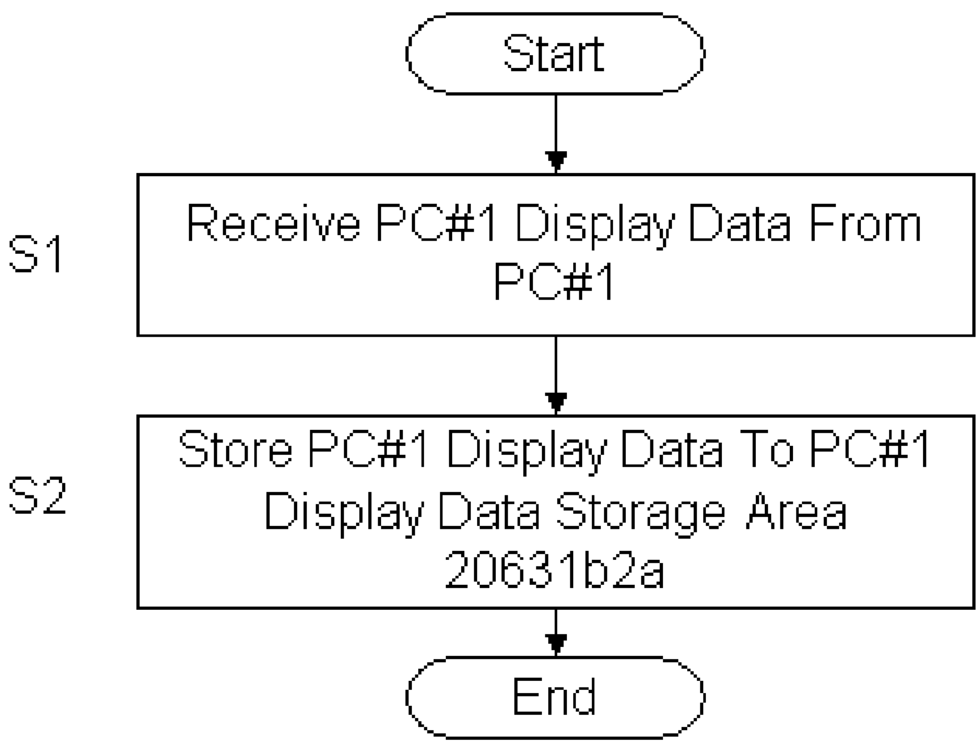

FIG. 697 is a flowchart illustrating an exemplary embodiment of the present invention.

Figure 698:
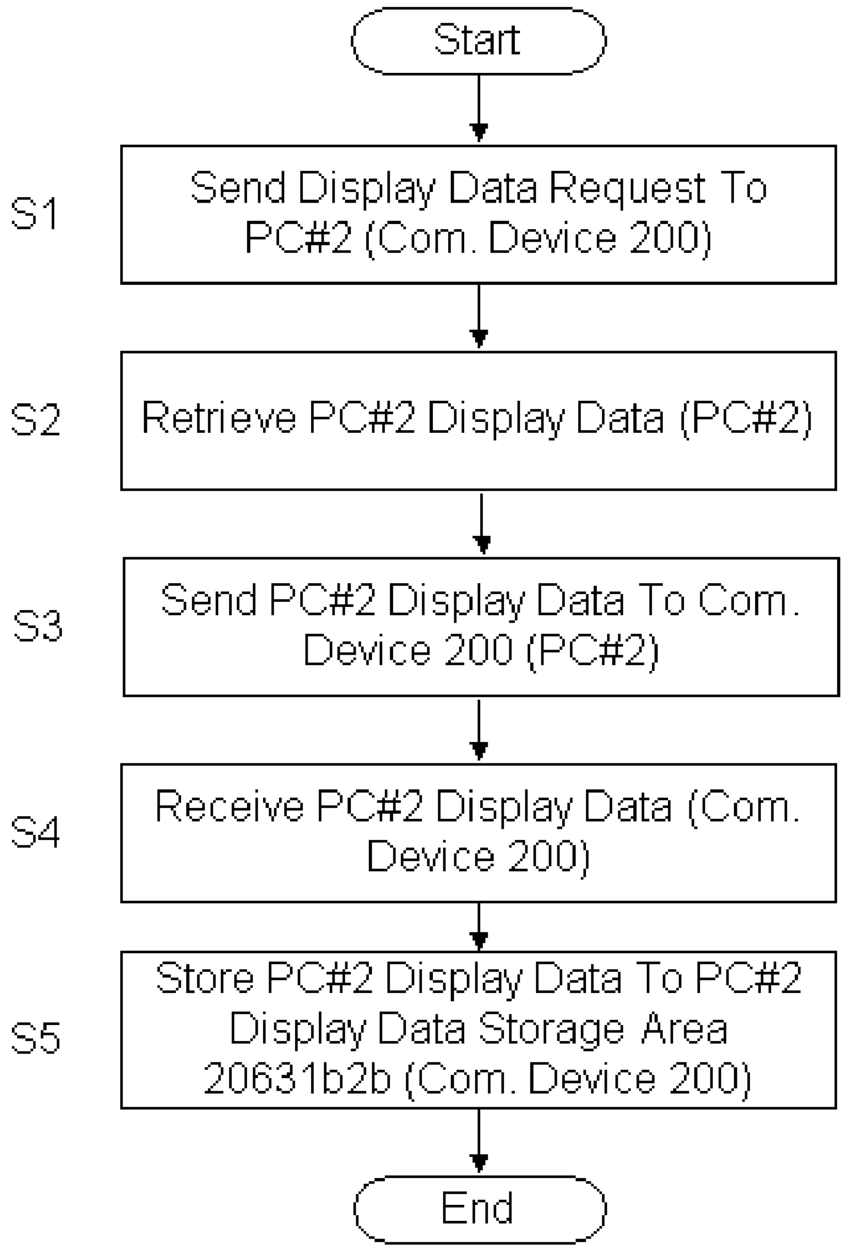

FIG. 698 is a flowchart illustrating an exemplary embodiment of the present invention.

Figure 699:
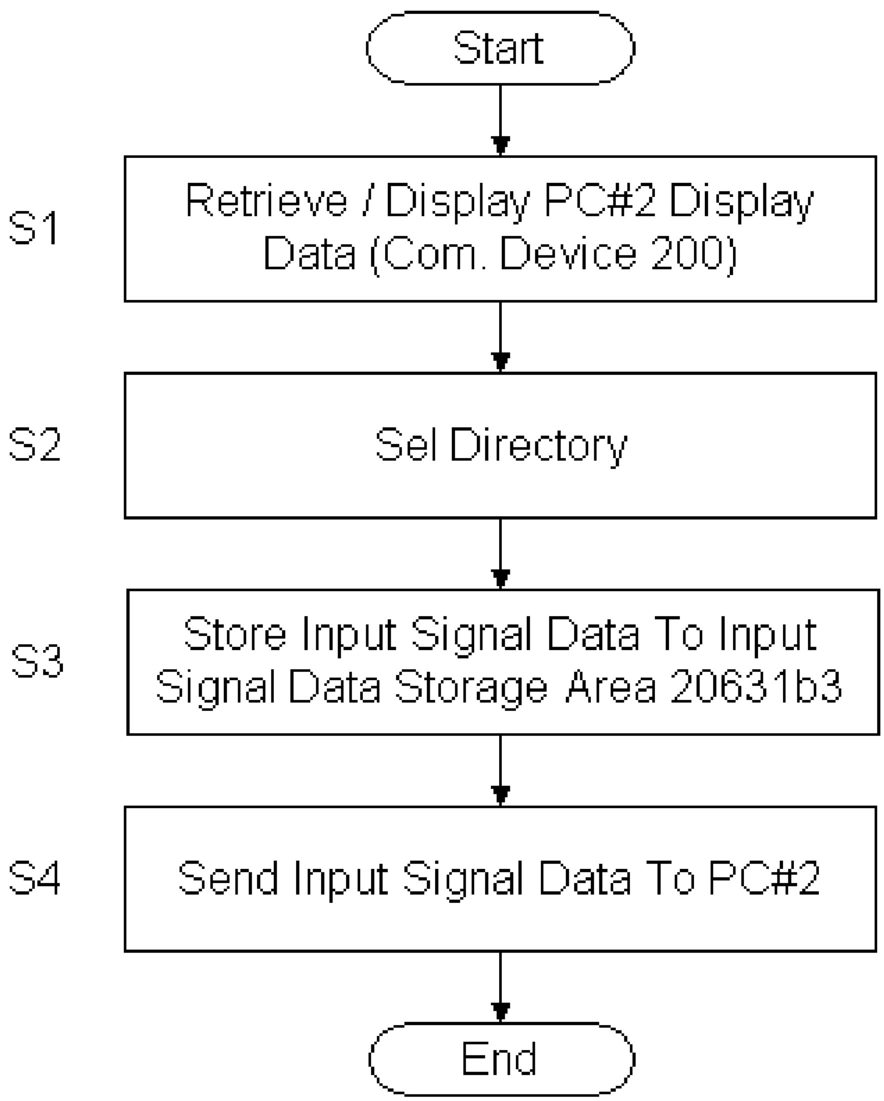

FIG. 699 is a flowchart illustrating an exemplary embodiment of the present invention.

Figure 700:
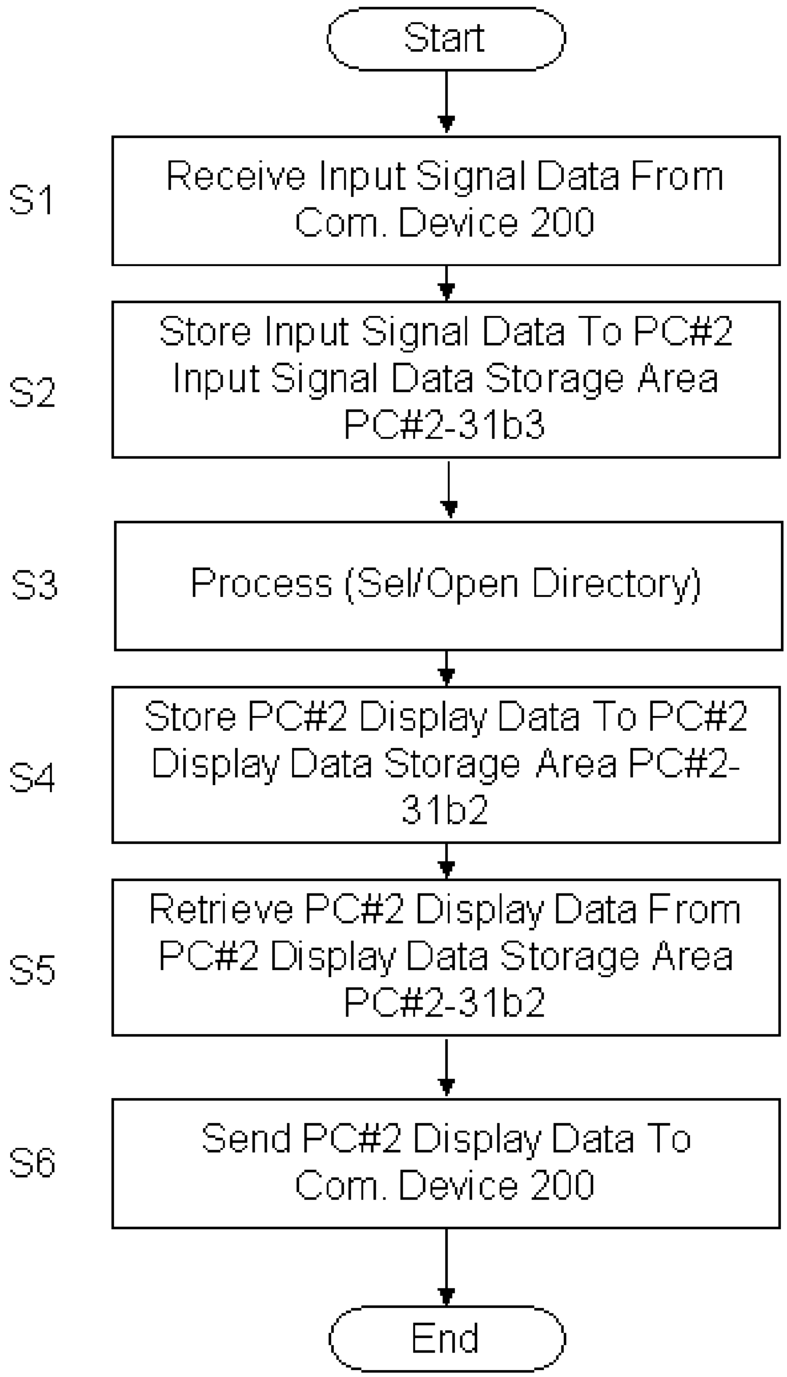

FIG. 700 is a flowchart illustrating an exemplary embodiment of the present invention.

Figure 701:
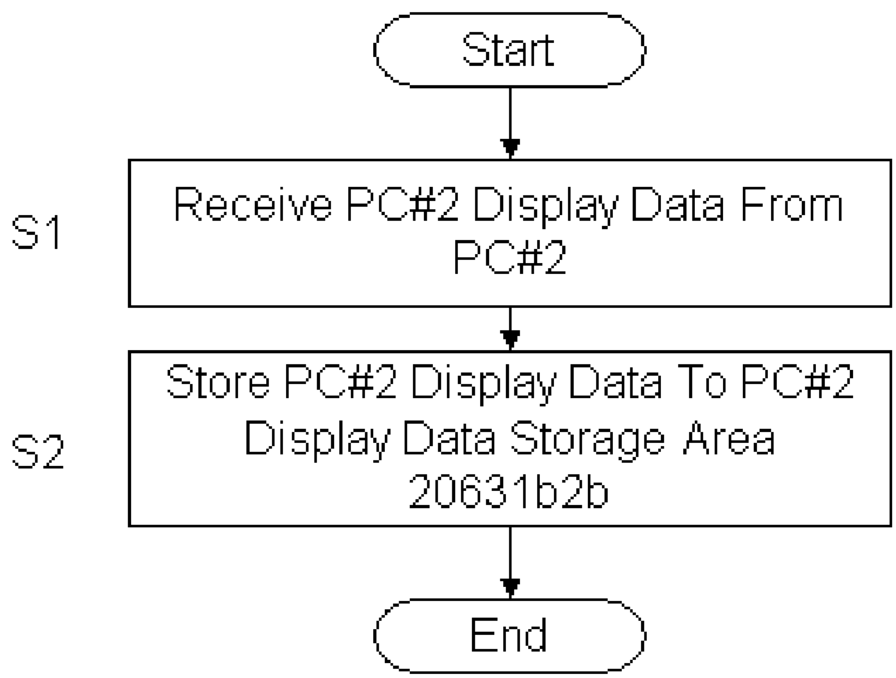

FIG. 701 is a flowchart illustrating an exemplary embodiment of the present invention.

Figure 702:
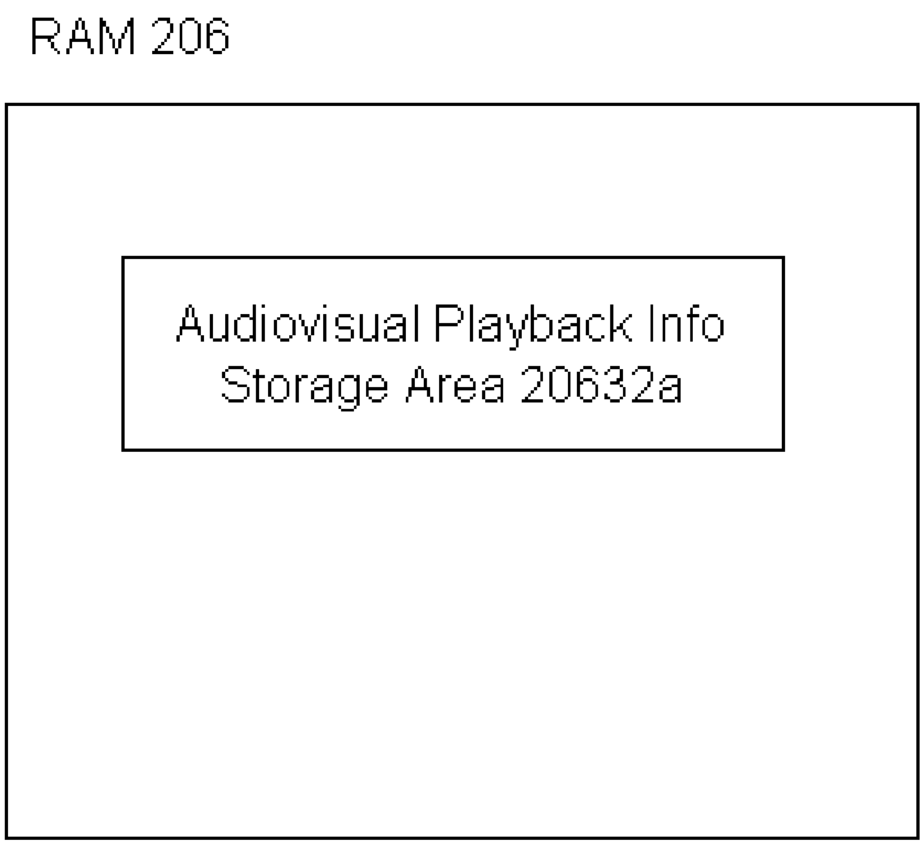

FIG. 702 is a block diagram illustrating an exemplary embodiment of the present invention.

Figure 703:
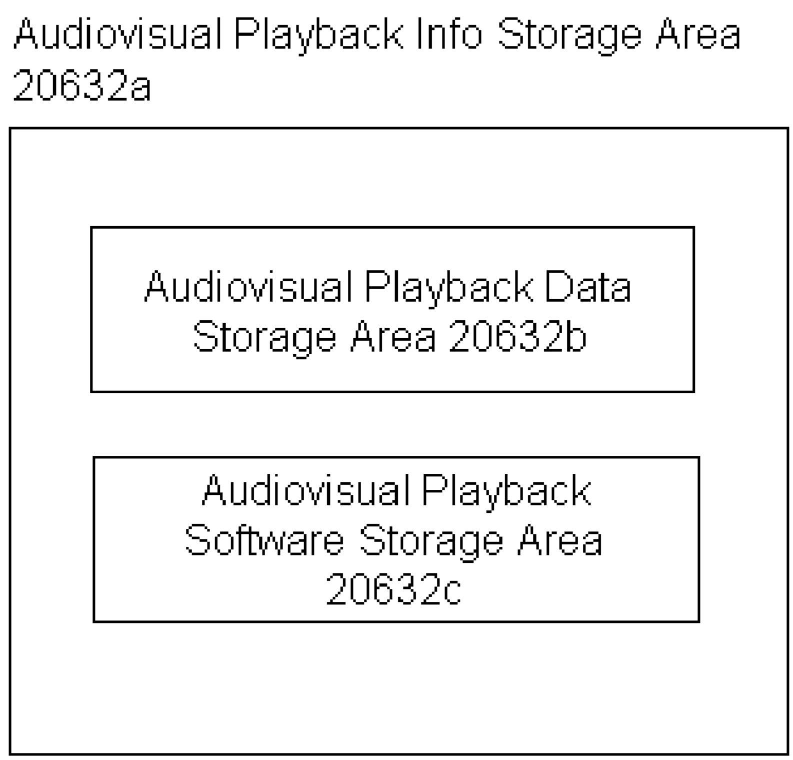

FIG. 703 is a block diagram illustrating an exemplary embodiment of the present invention.

Figure 704:
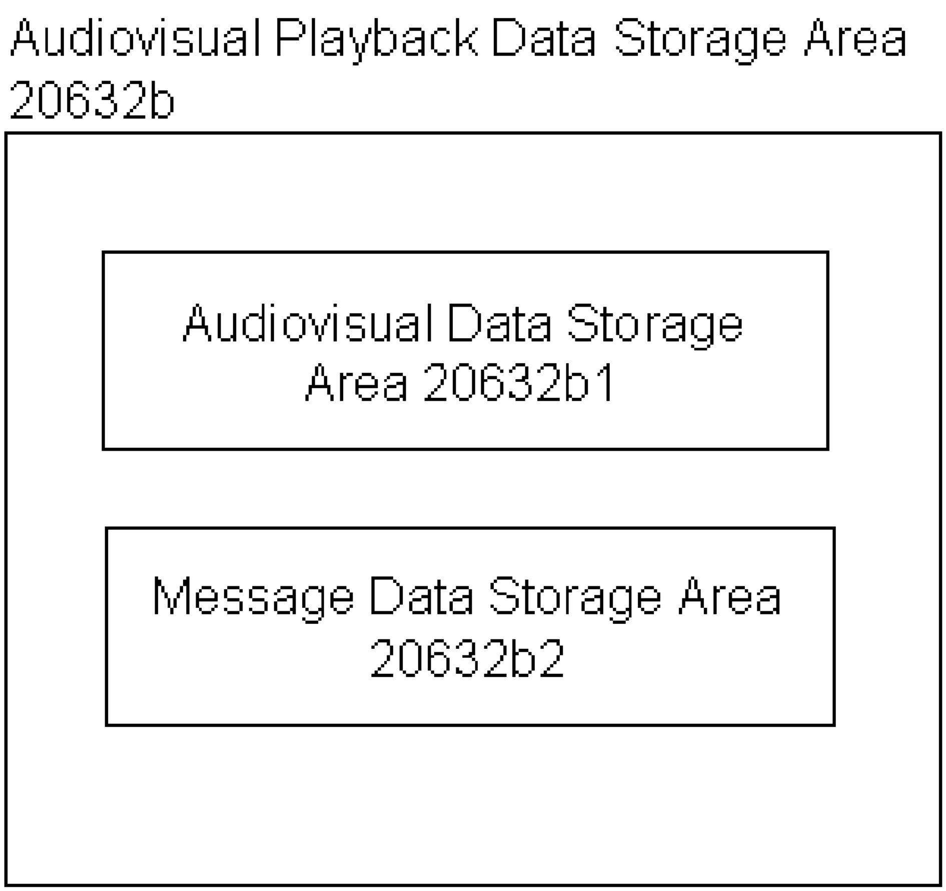

FIG. 704 is a block diagram illustrating an exemplary embodiment of the present invention.

Figure 705:
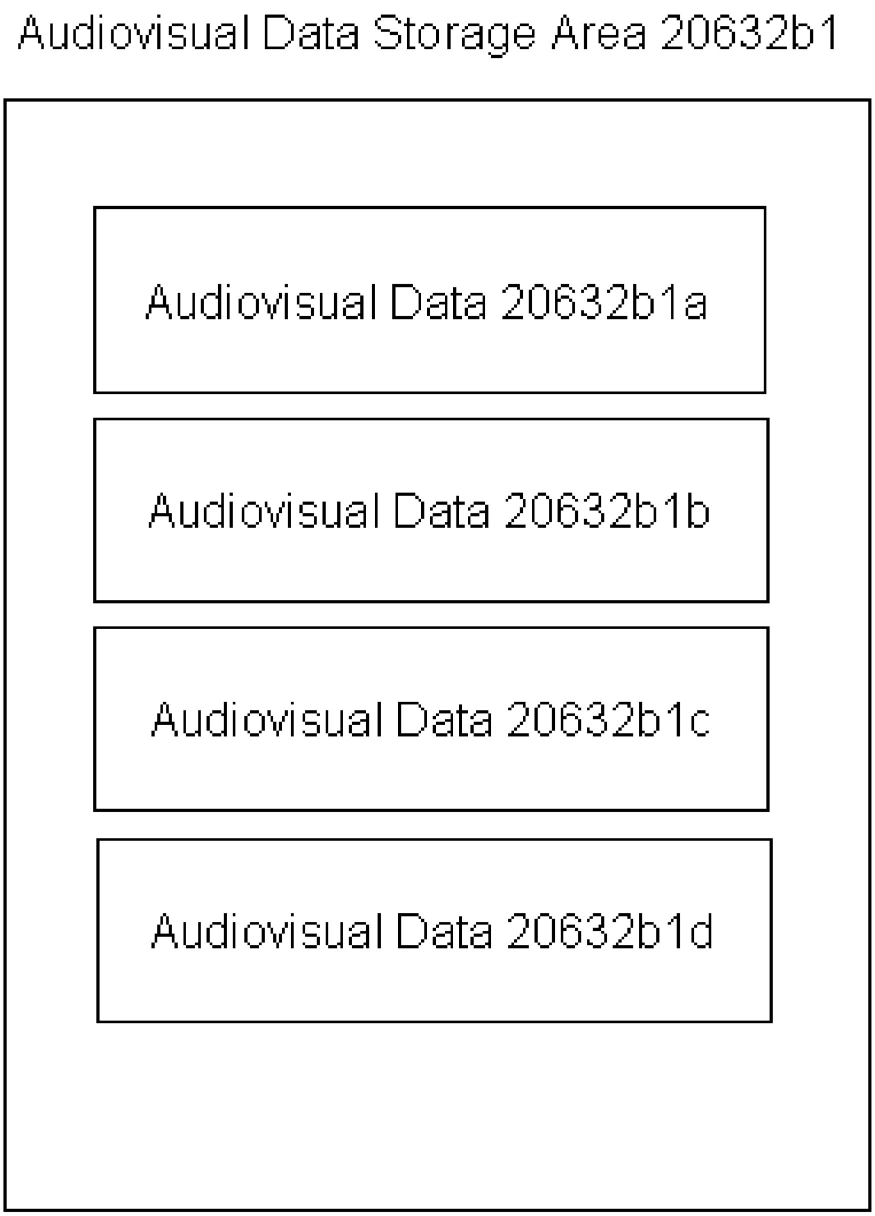

FIG. 705 is a block diagram illustrating an exemplary embodiment of the present invention.

FIG. 706 is a block diagram illustrating an exemplary embodiment of the present invention.

FIG. 707 is a block diagram illustrating an exemplary embodiment of the present invention.

Figure 708:
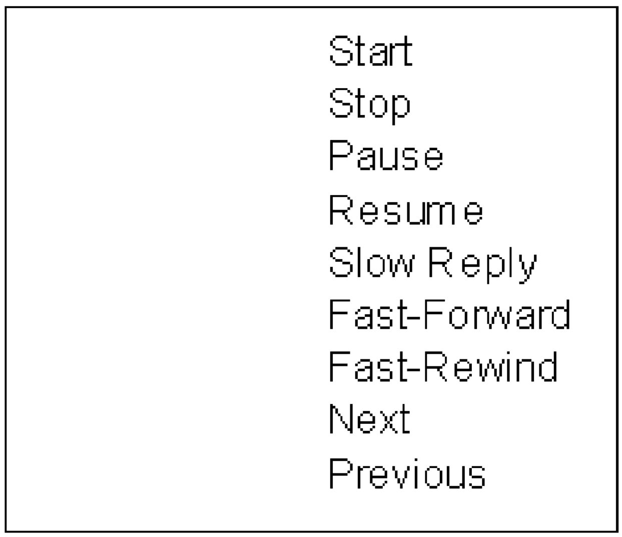

FIG. 708 is a simplified illustration illustrating an exemplary embodiment of the present invention.

Figure 708A:
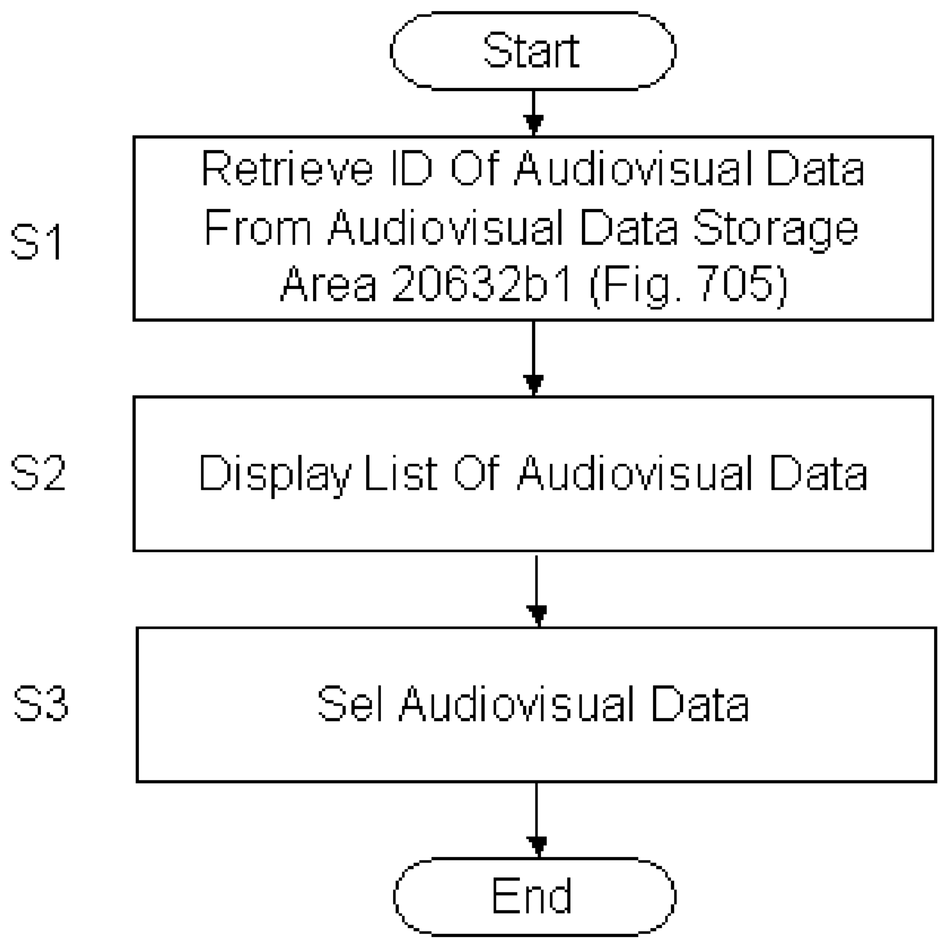

FIG. 708*a* is a flowchart illustrating an exemplary embodiment of the present invention.

Figure 709:
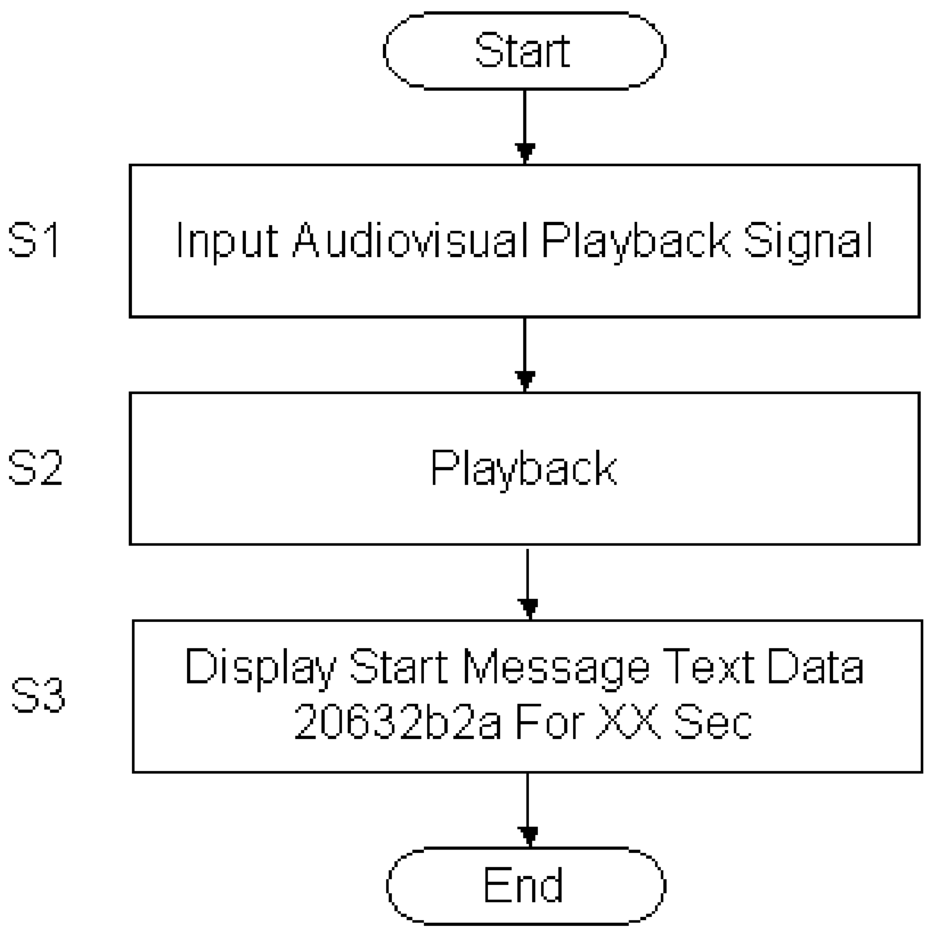

FIG. 709 is a flowchart illustrating an exemplary embodiment of the present invention.

Figure 710:
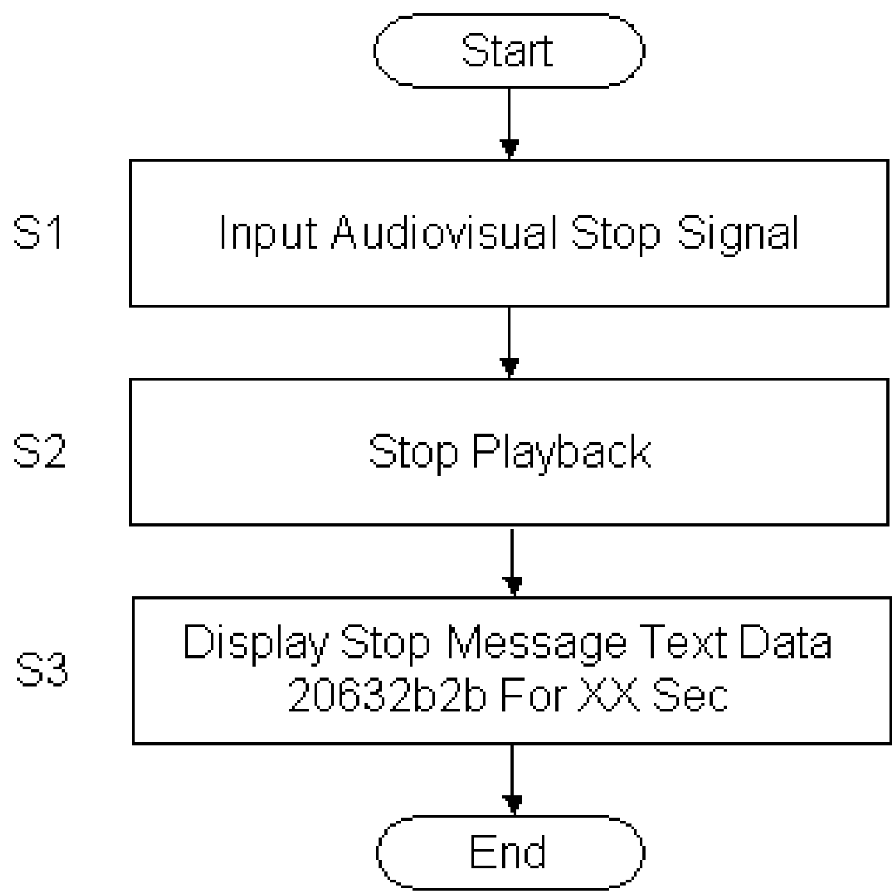

FIG. 710 is a flowchart illustrating an exemplary embodiment of the present invention.

Figure 711:
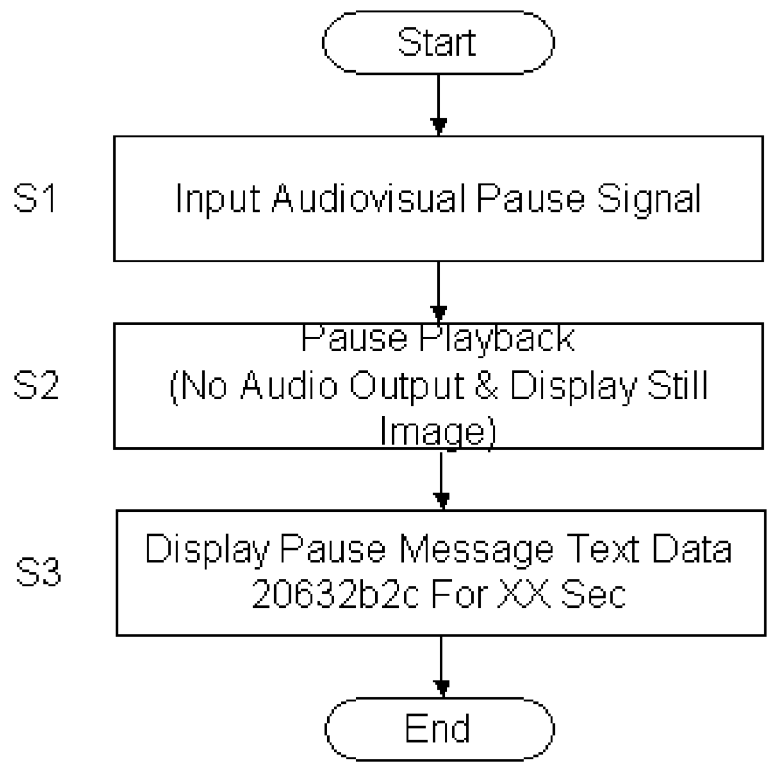

FIG. 711 is a flowchart illustrating an exemplary embodiment of the present invention.

Figure 711A:
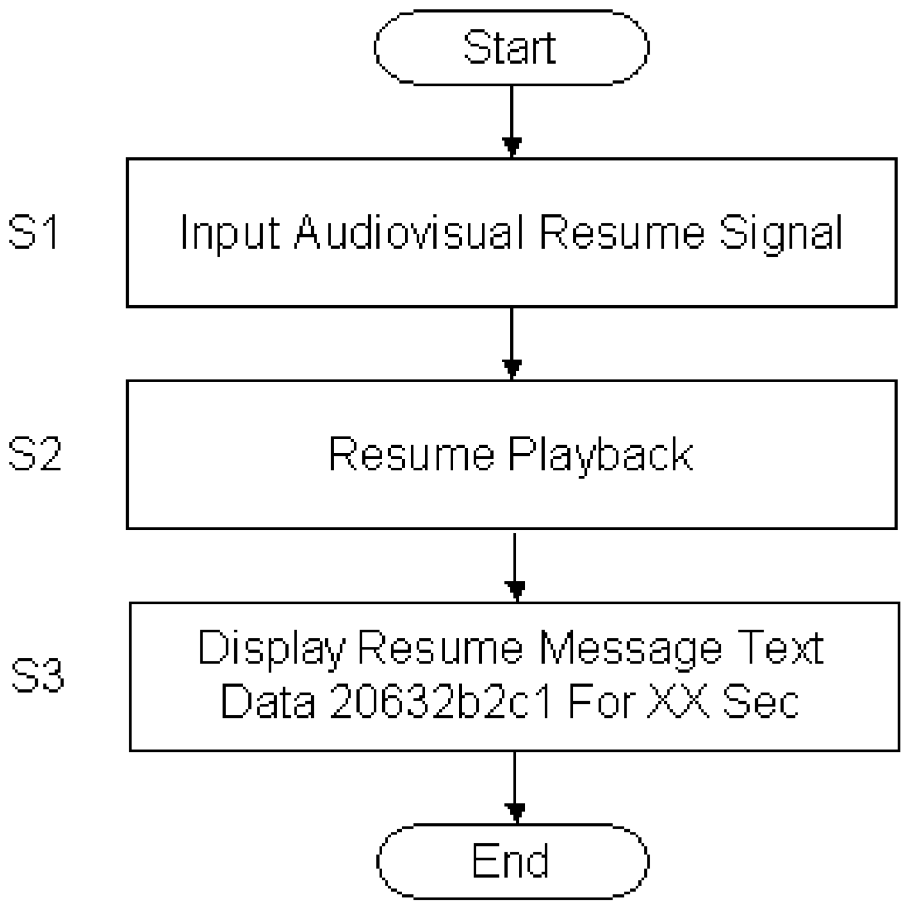

FIG. 711*a* is a flowchart illustrating an exemplary embodiment of the present invention.

Figure 712:
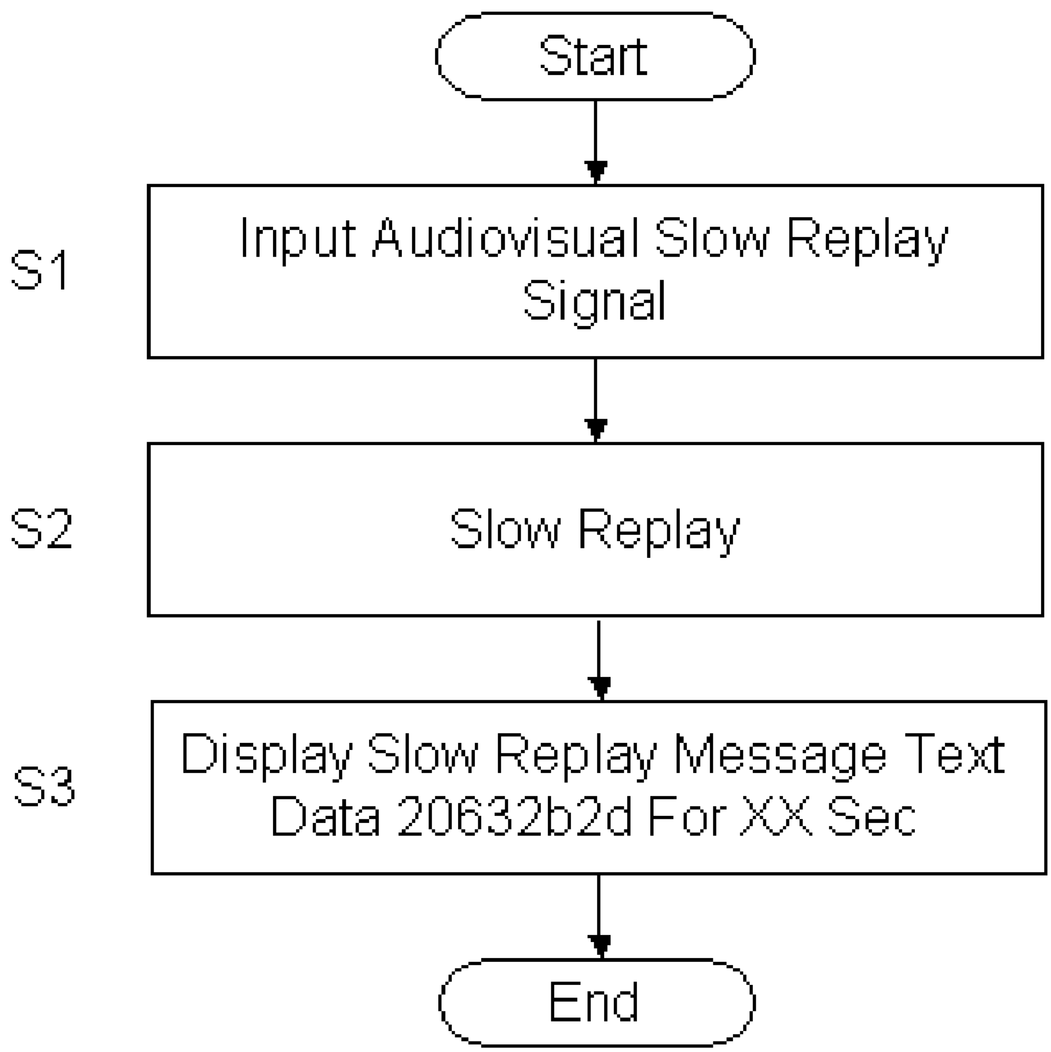

FIG. 712 is a flowchart illustrating an exemplary embodiment of the present invention.

Figure 713:
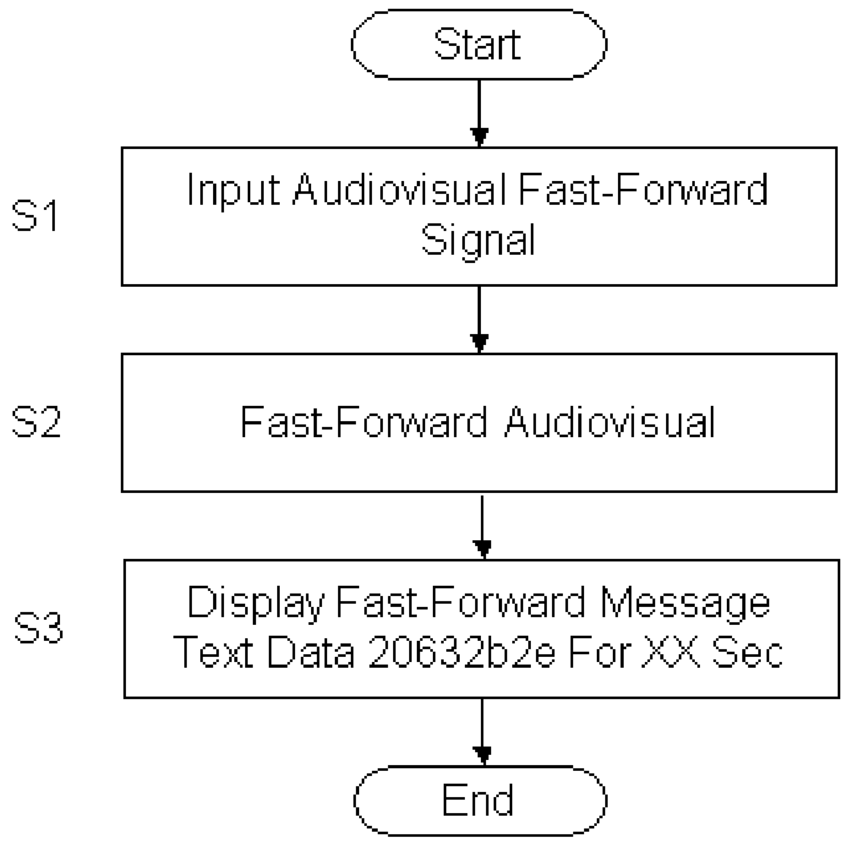

FIG. 713 is a flowchart illustrating an exemplary embodiment of the present invention.

Figure 714:
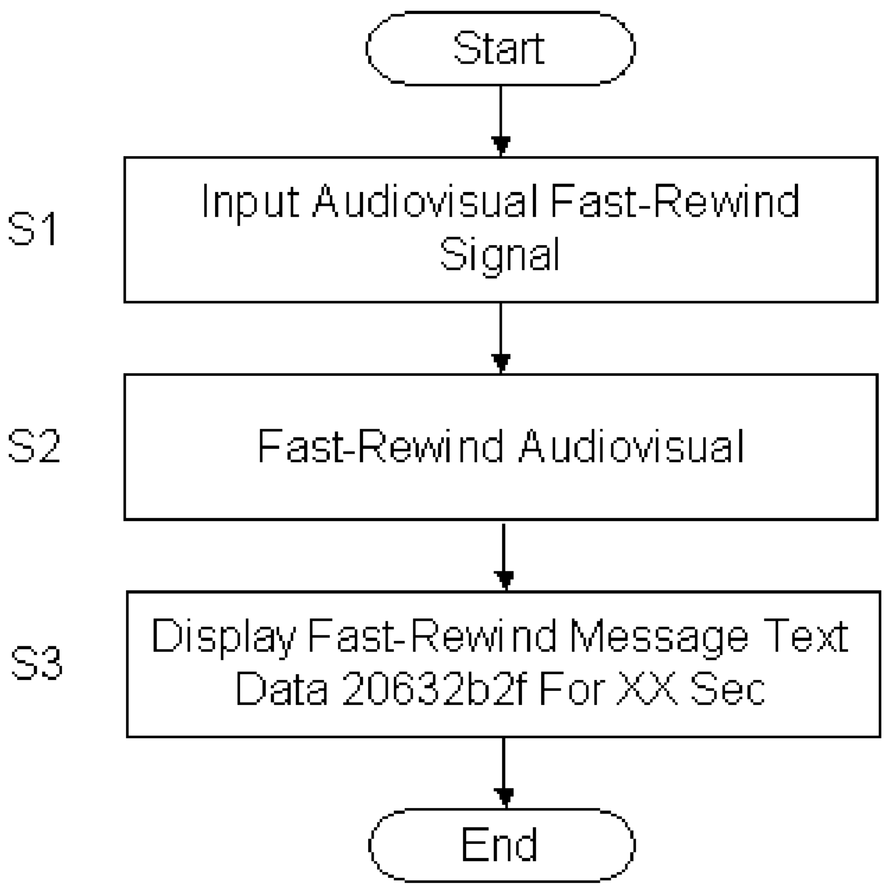

FIG. 714 is a flowchart illustrating an exemplary embodiment of the present invention.

Figure 715:
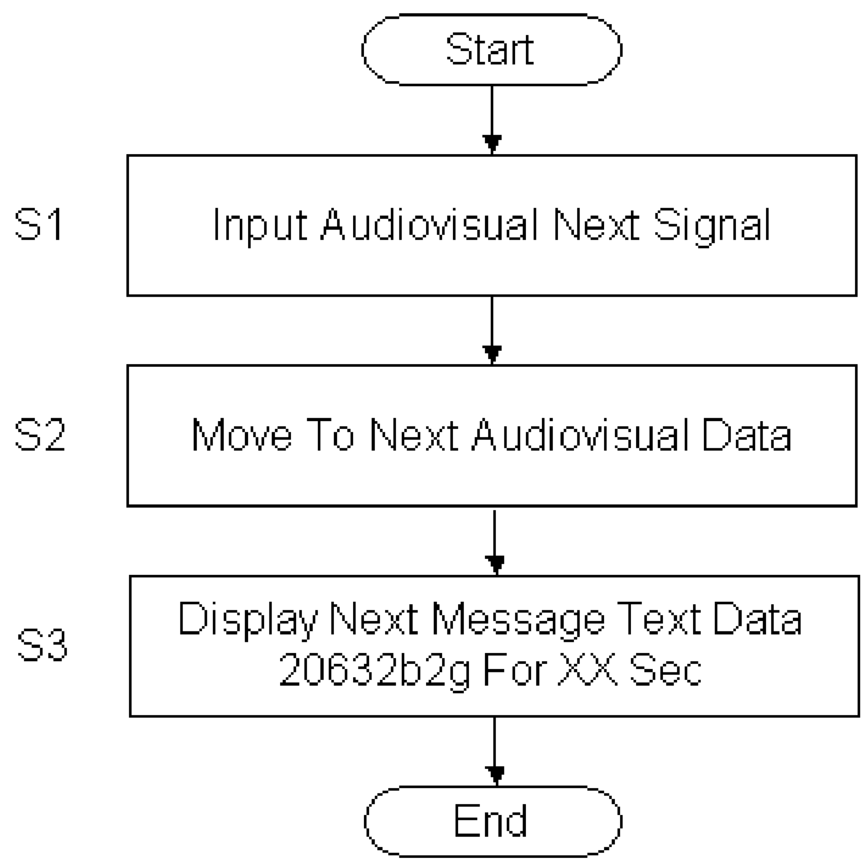

FIG. 715 is a flowchart illustrating an exemplary embodiment of the present invention.

Figure 716:
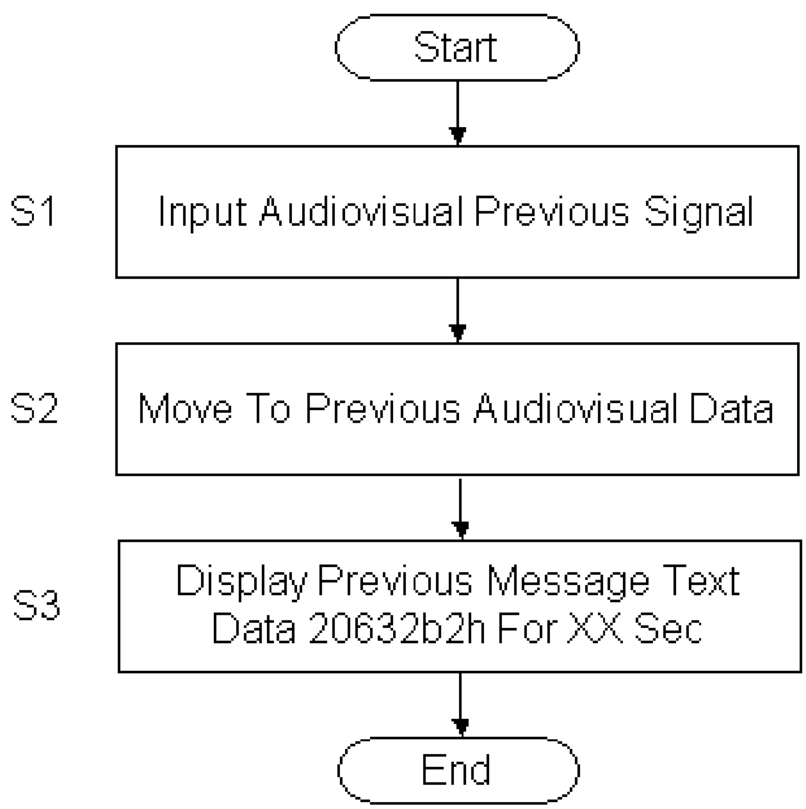

FIG. 716 is a flowchart illustrating an exemplary embodiment of the present invention.

Figure 717:
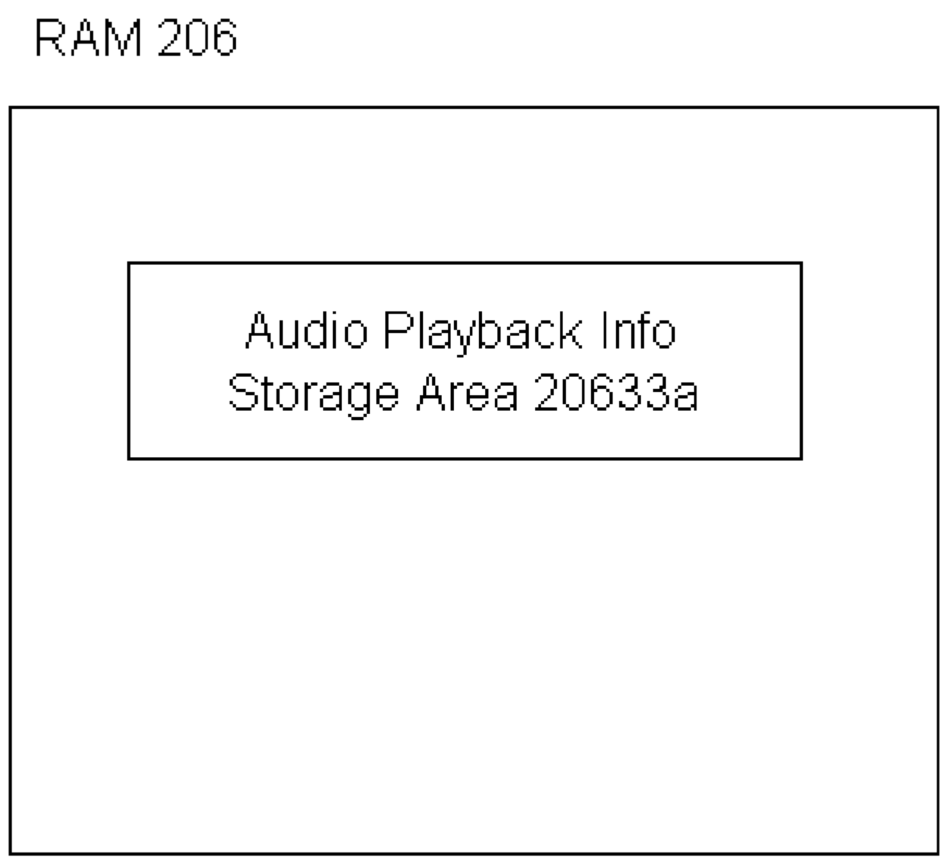

FIG. 717 is a block diagram illustrating an exemplary embodiment of the present invention.

Figure 718:
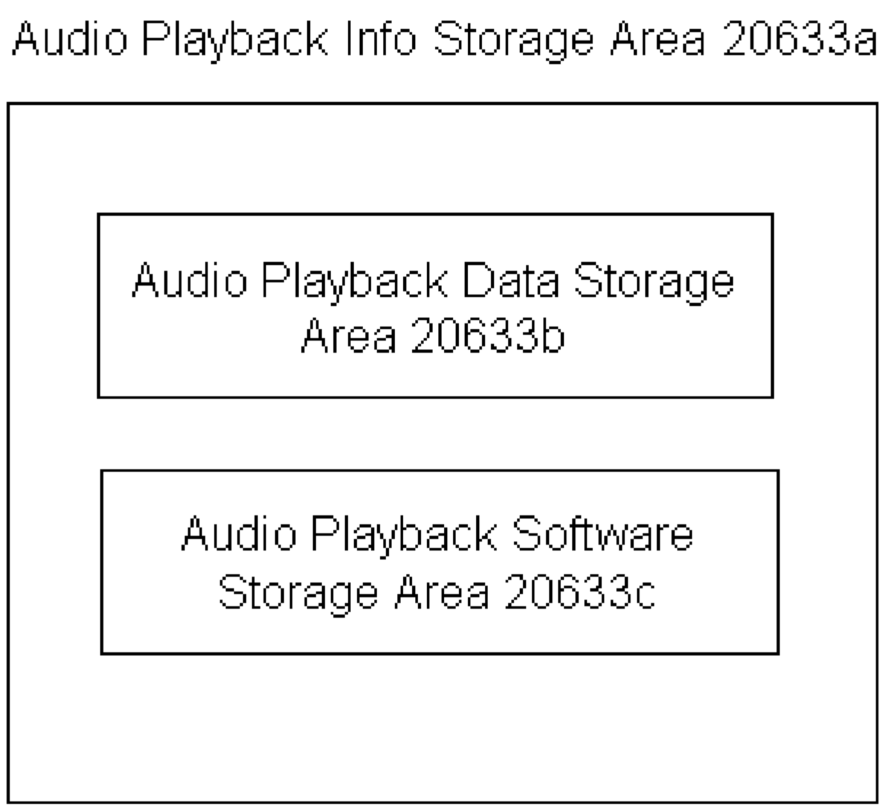

FIG. 718 is a block diagram illustrating an exemplary embodiment of the present invention.

Figure 719:
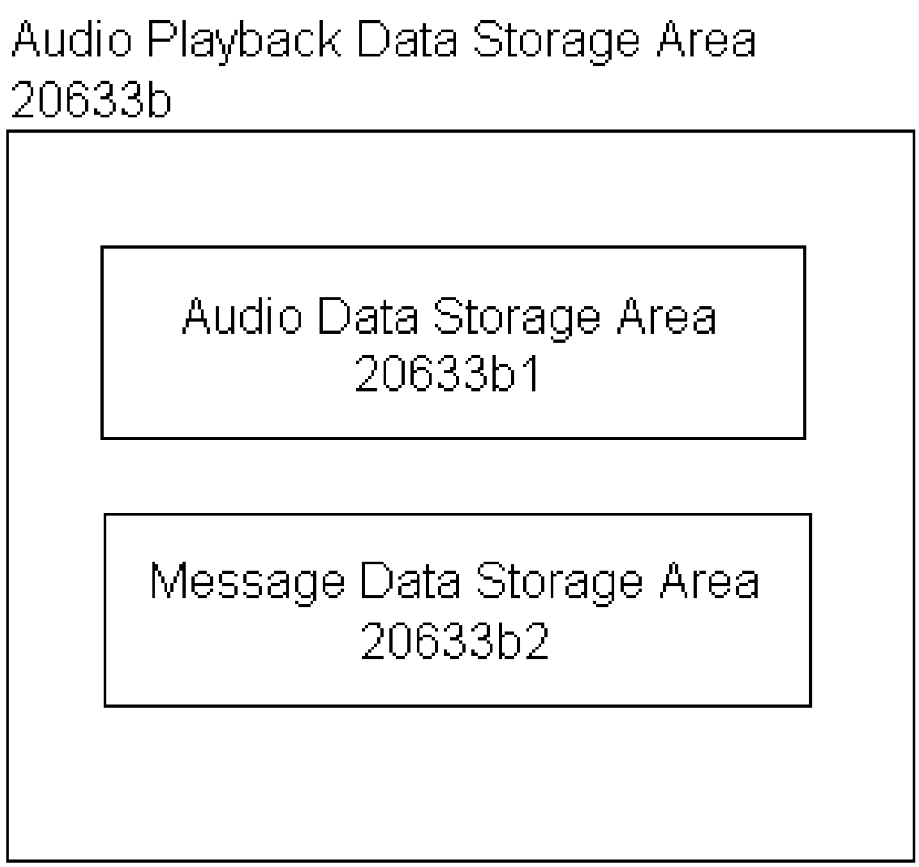

FIG. 719 is a block diagram illustrating an exemplary embodiment of the present invention.

Figure 720:
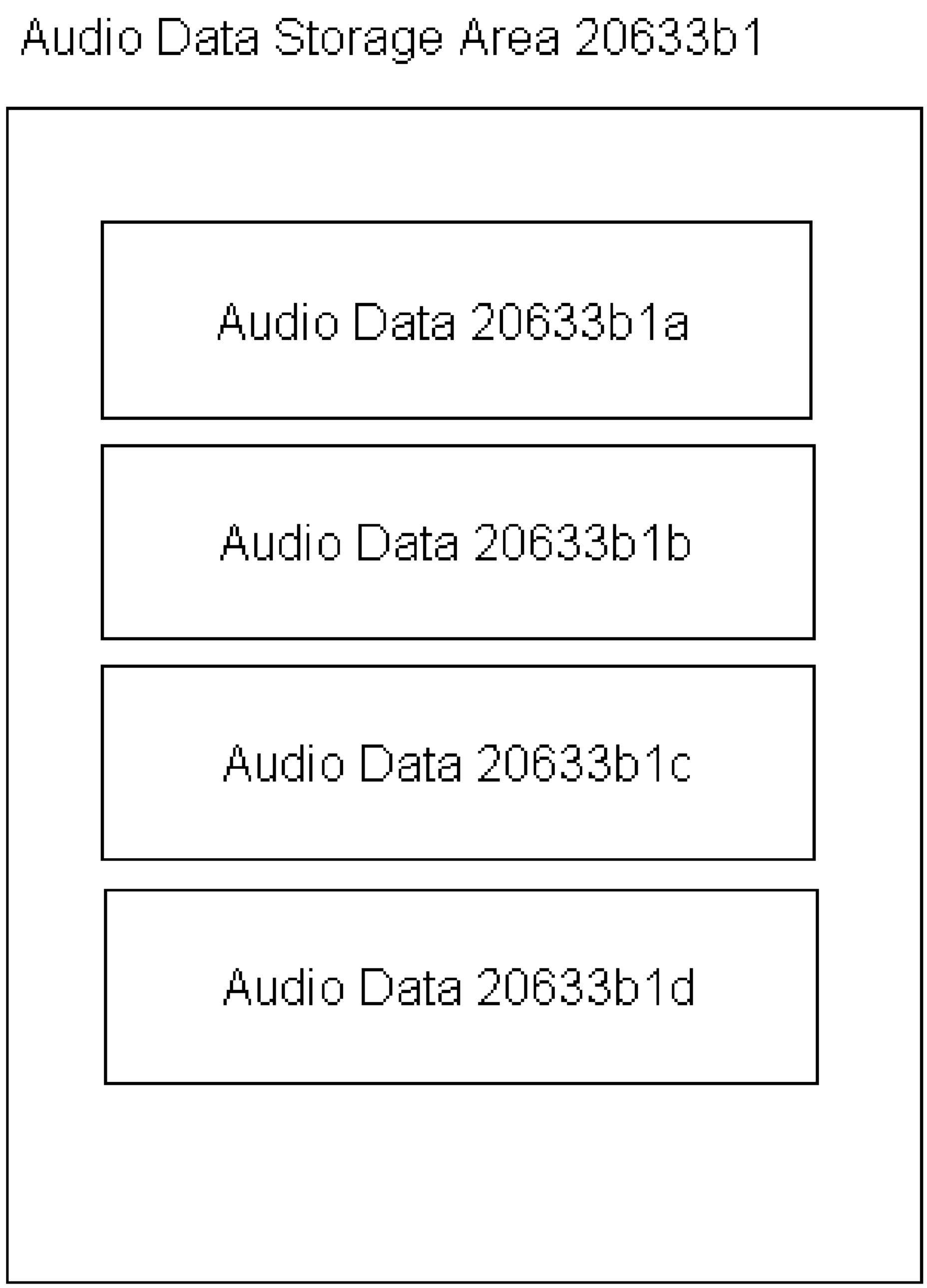

FIG. 720 is a block diagram illustrating an exemplary embodiment of the present invention.

FIG. 721 is a block diagram illustrating an exemplary embodiment of the present invention.

FIG. 722 is a block diagram illustrating an exemplary embodiment of the present invention.

Figure 723:
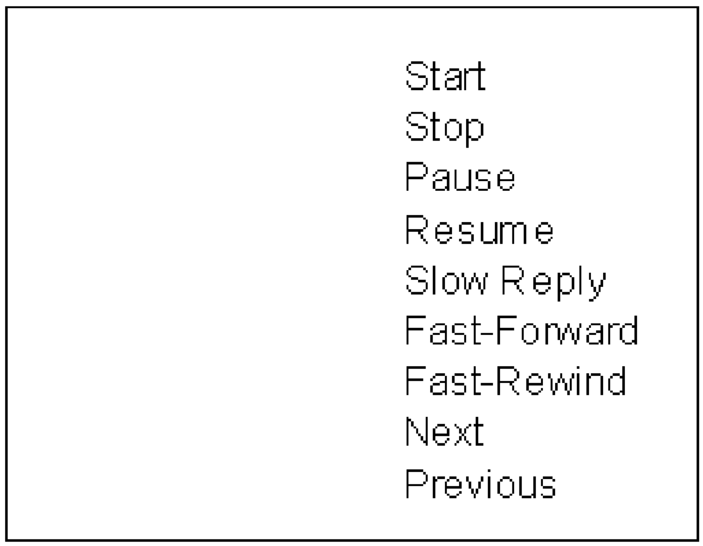

FIG. 723 is a simplified illustration illustrating an exemplary embodiment of the present invention.

Figure 723A:
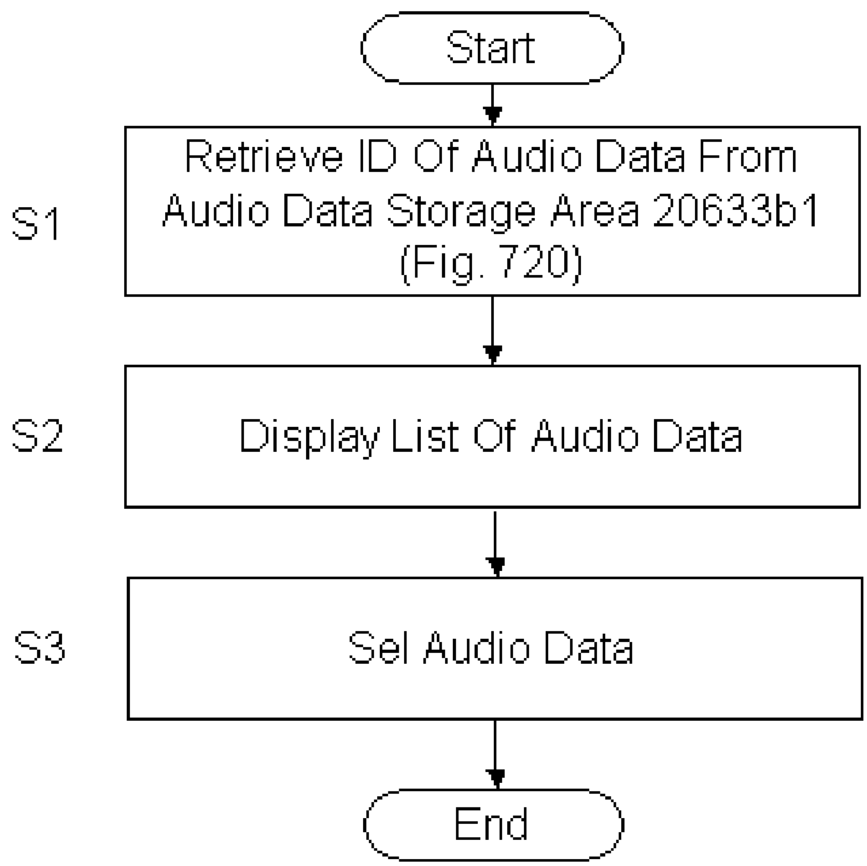

FIG. 723*a* is a flowchart illustrating an exemplary embodiment of the present invention.

Figure 724:
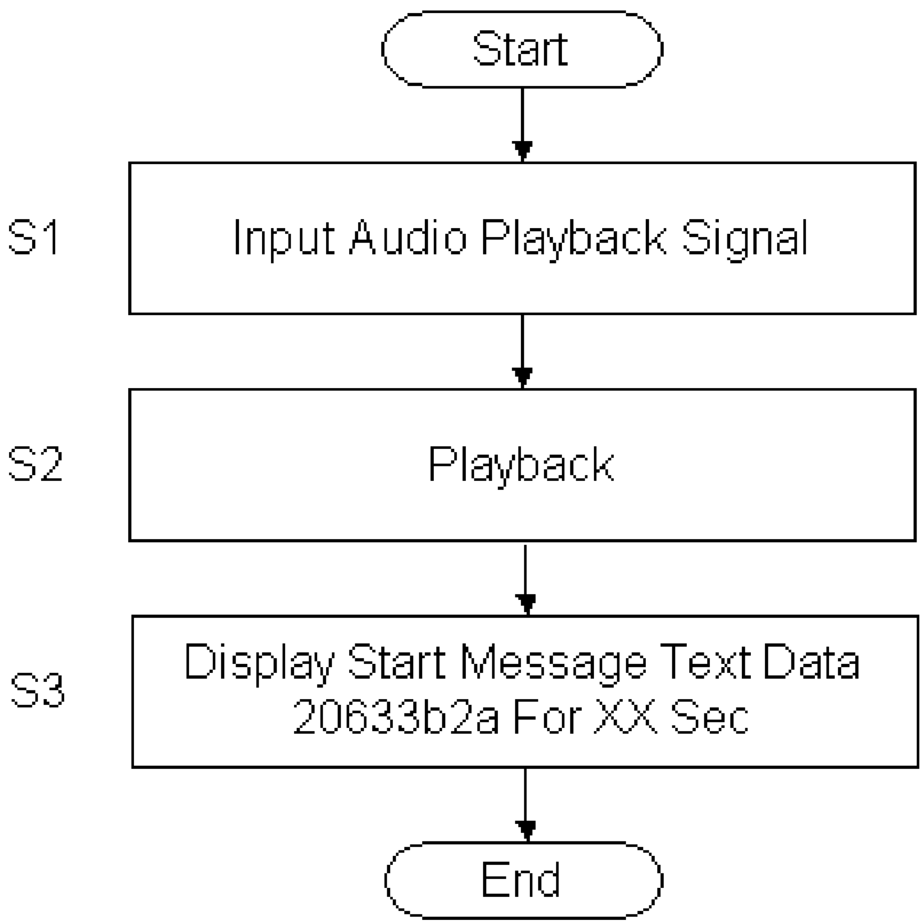

FIG. 724 is a flowchart illustrating an exemplary embodiment of the present invention.

Figure 725:
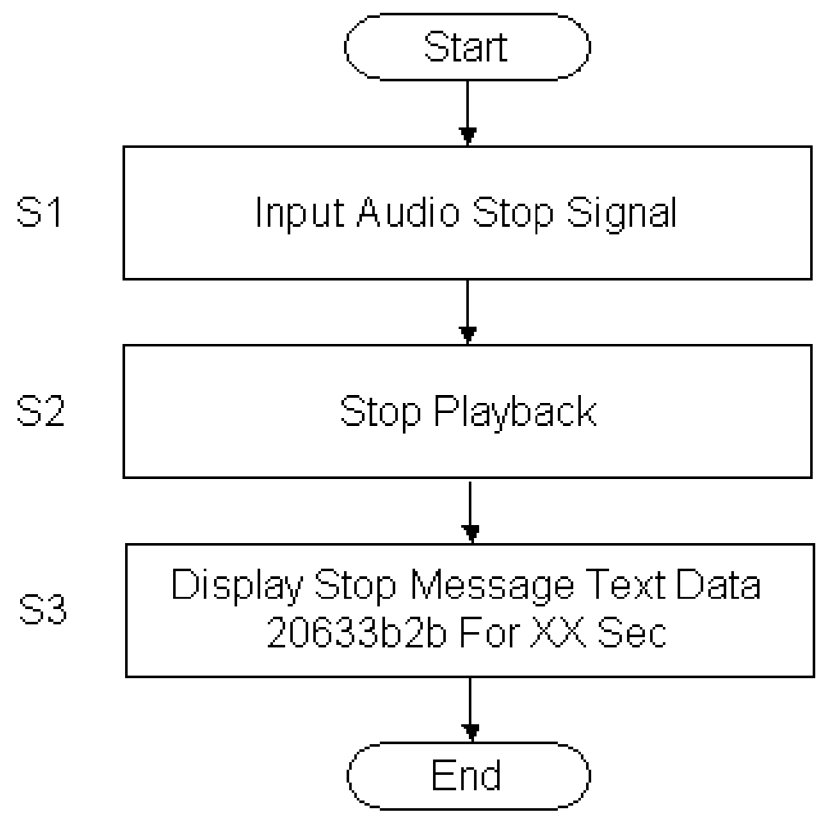

FIG. 725 is a flowchart illustrating an exemplary embodiment of the present invention.

Figure 726:
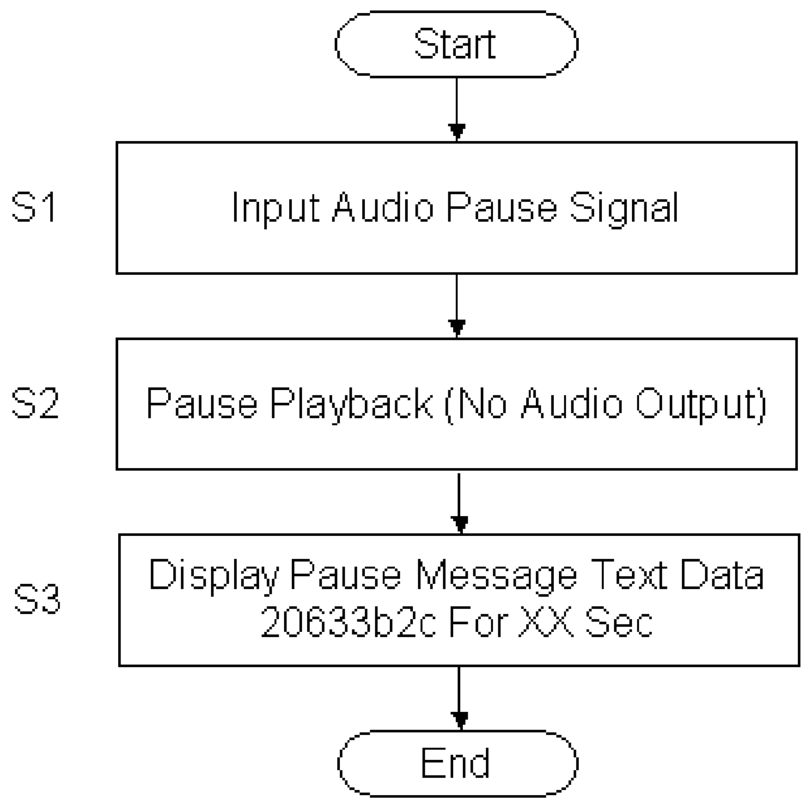

FIG. 726 is a flowchart illustrating an exemplary embodiment of the present invention.

Figure 726A:
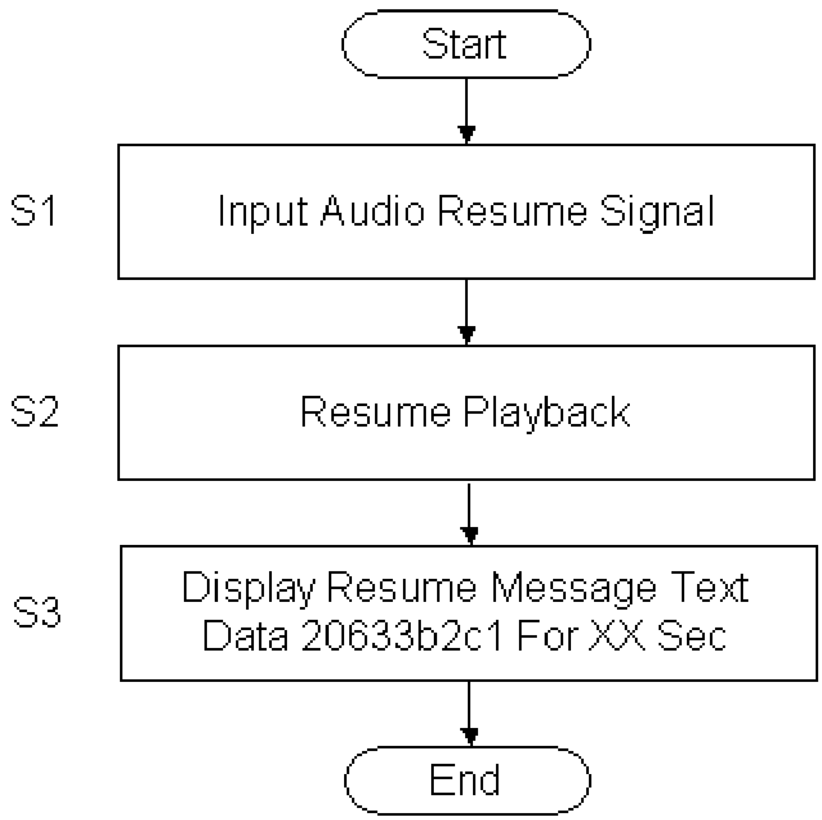

FIG. 726*a* is a flowchart illustrating an exemplary embodiment of the present invention.

Figure 727:
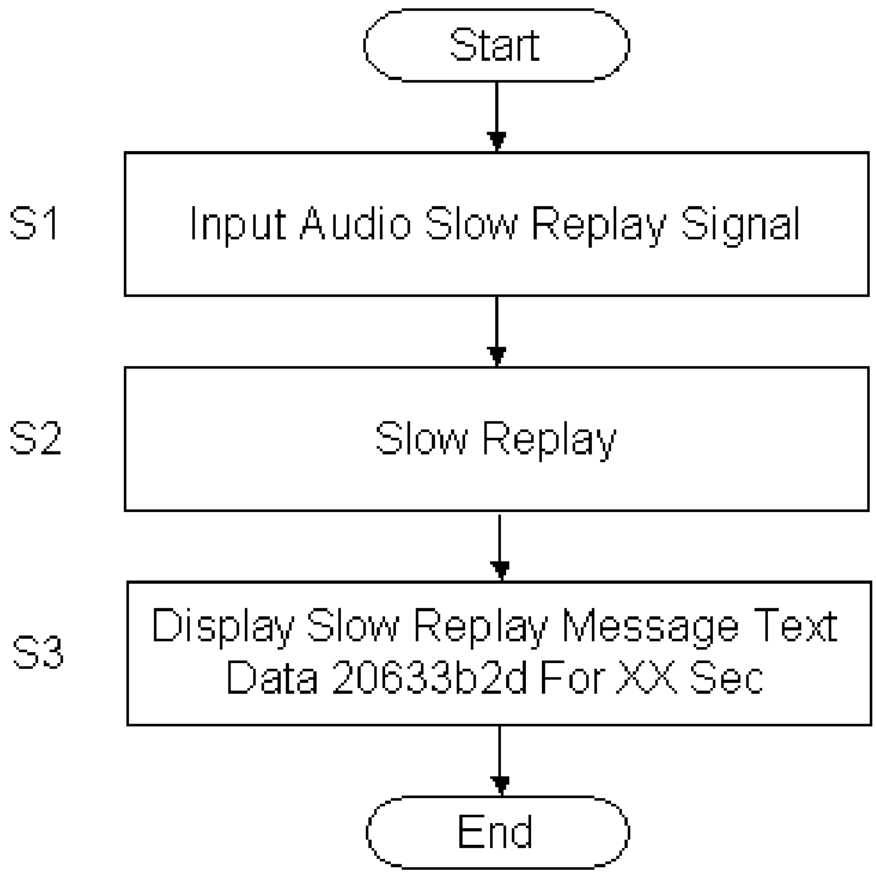

FIG. 727 is a flowchart illustrating an exemplary embodiment of the present invention.

Figure 728:
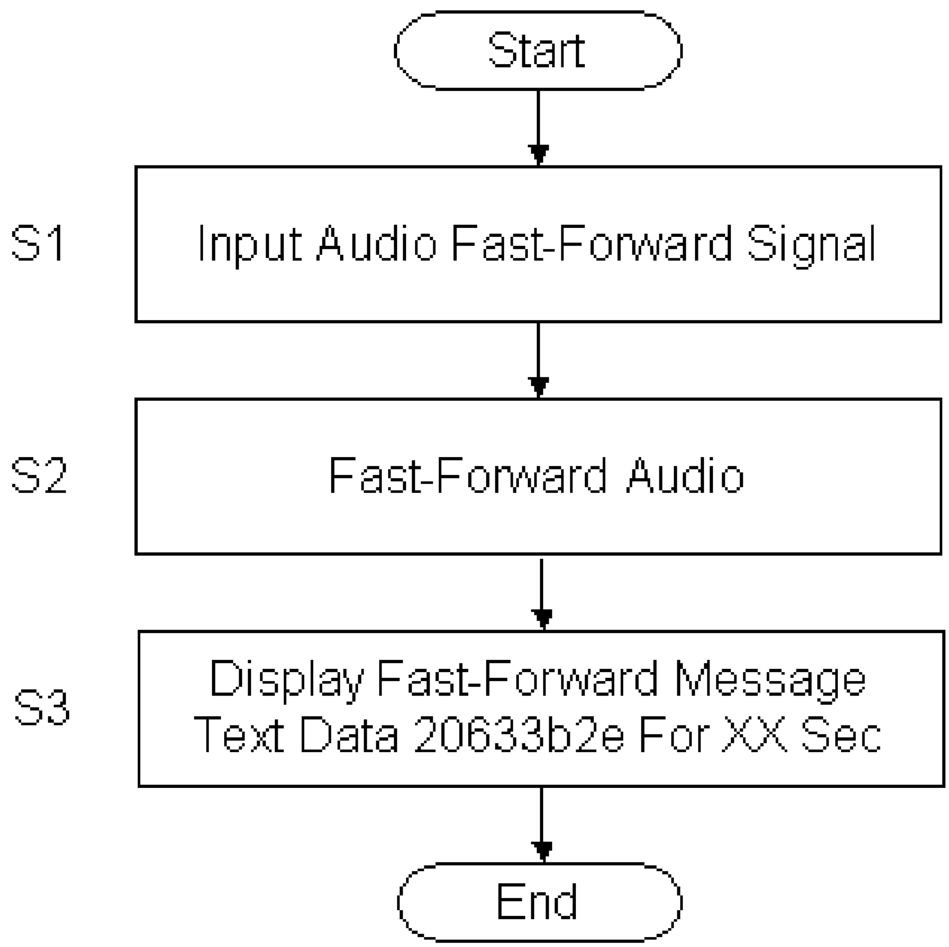

FIG. 728 is a flowchart illustrating an exemplary embodiment of the present invention.

Figure 729:
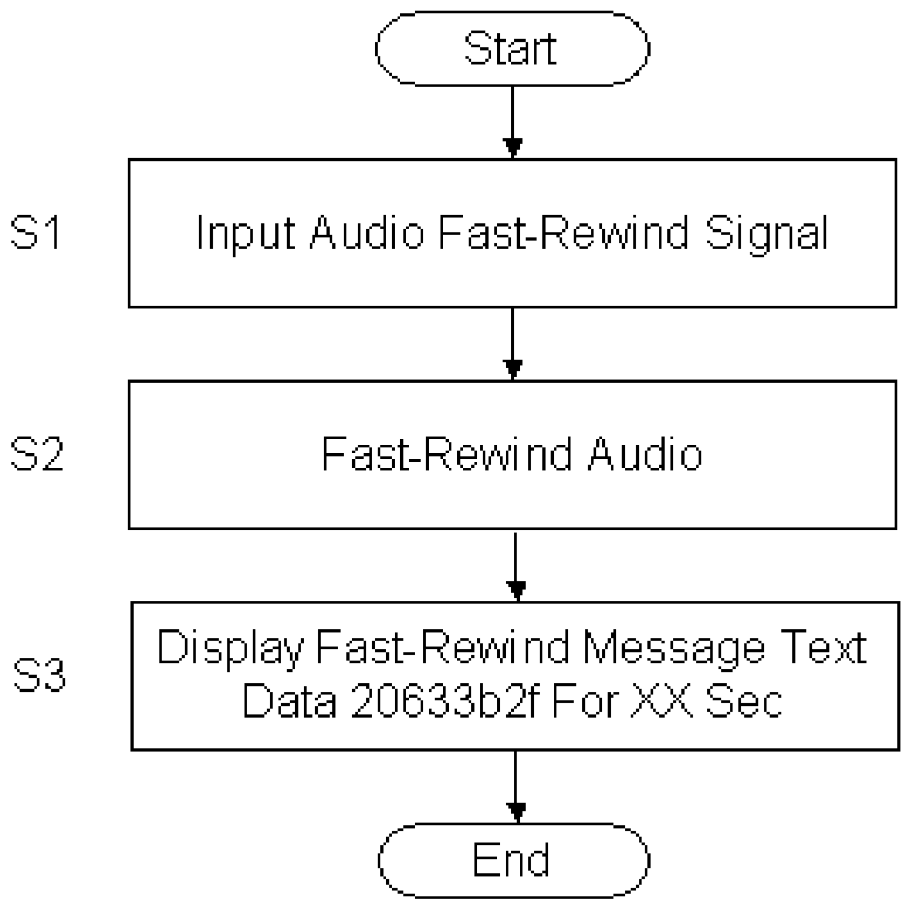

FIG. 729 is a flowchart illustrating an exemplary embodiment of the present invention.

Figure 730:
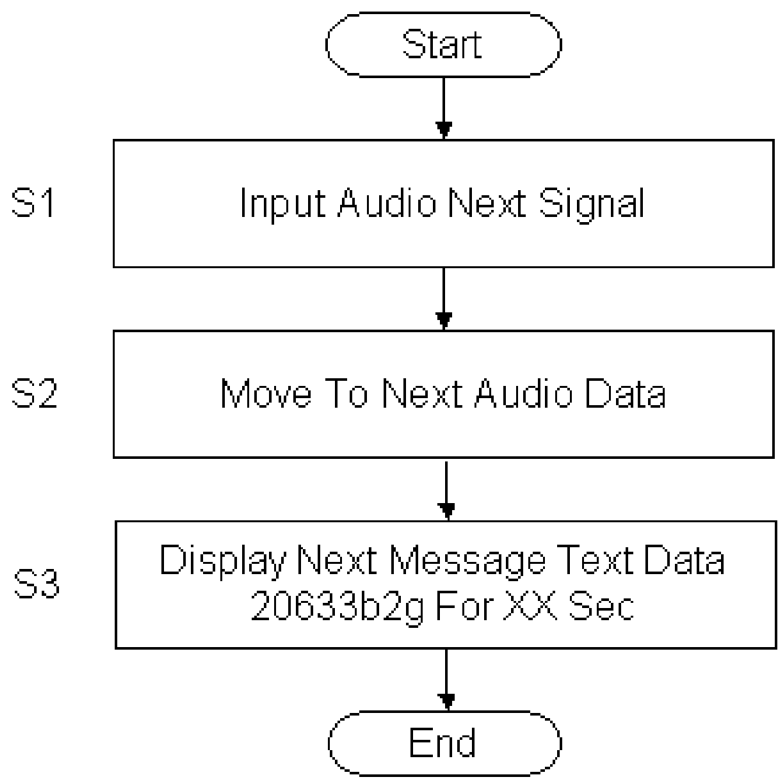

FIG. 730 is a flowchart illustrating an exemplary embodiment of the present invention.

Figure 731:
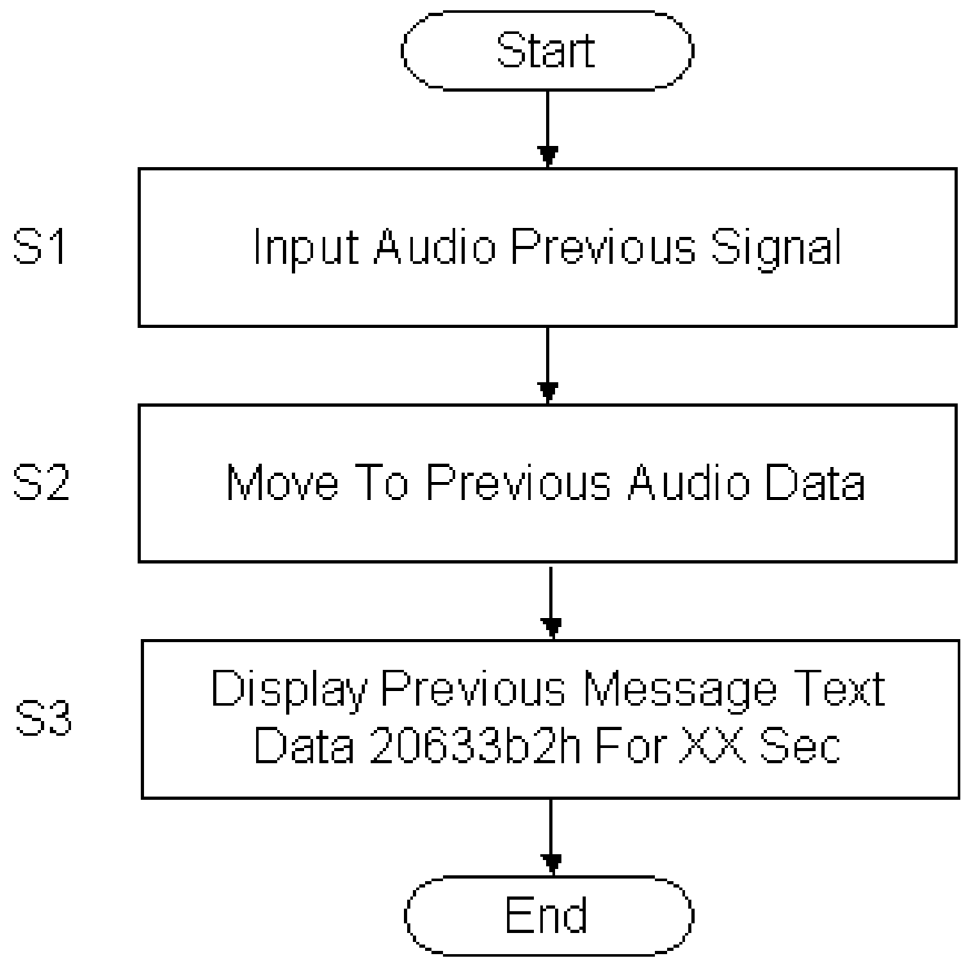

FIG. 731 is a flowchart illustrating an exemplary embodiment of the present invention.

Figure 732:
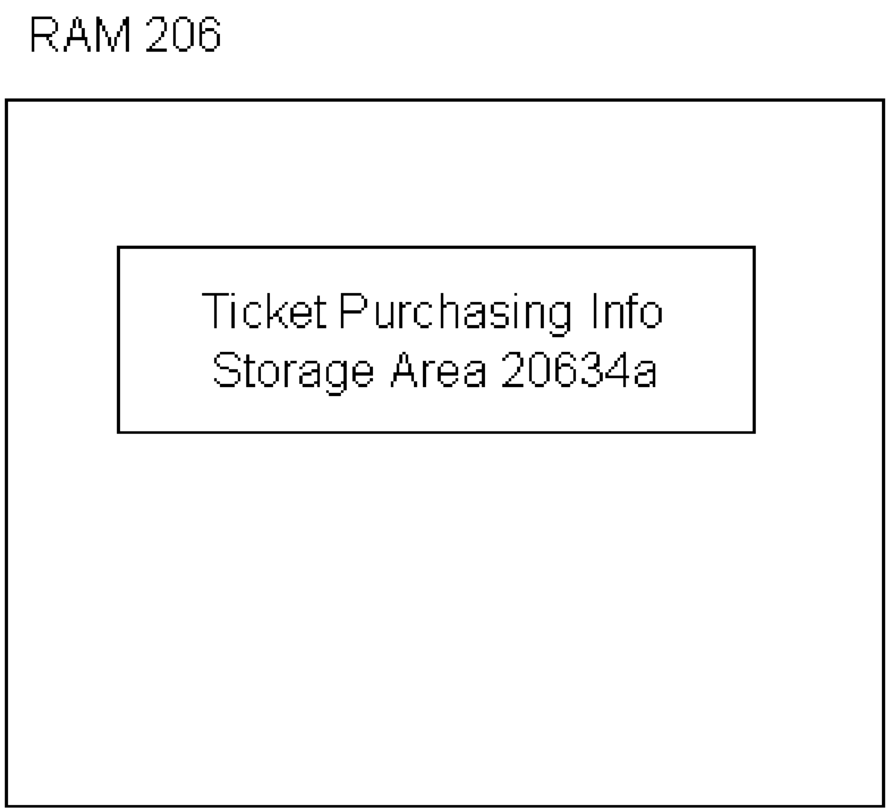

FIG. 732 is a block diagram illustrating an exemplary embodiment of the present invention.

Figure 733:
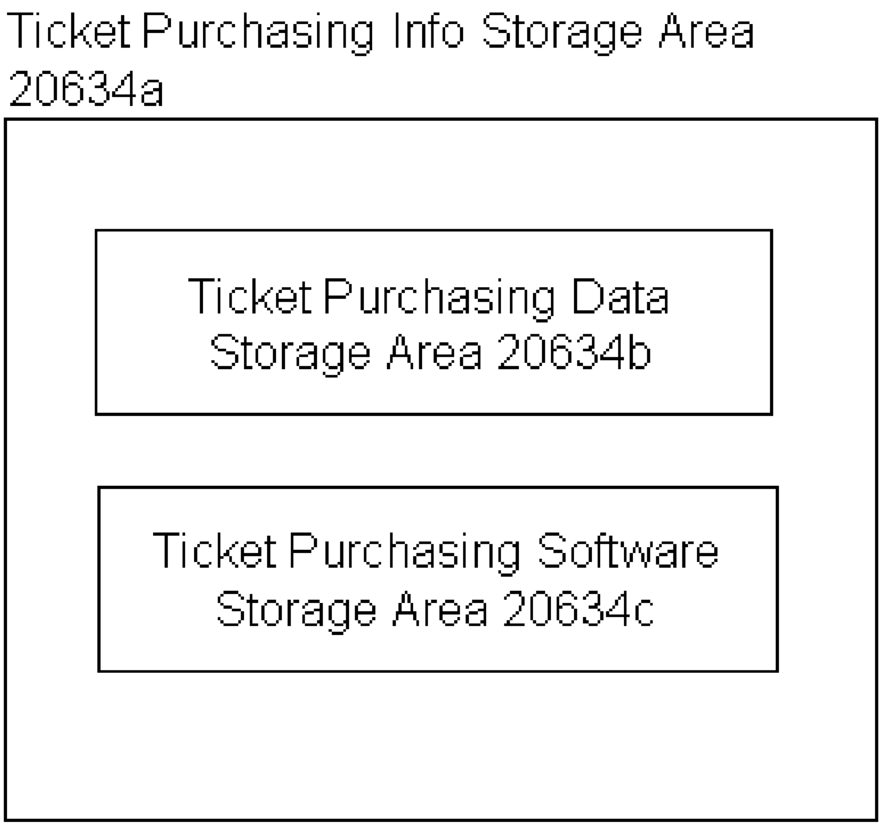

FIG. 733 is a block diagram illustrating an exemplary embodiment of the present invention.

Figure 734:
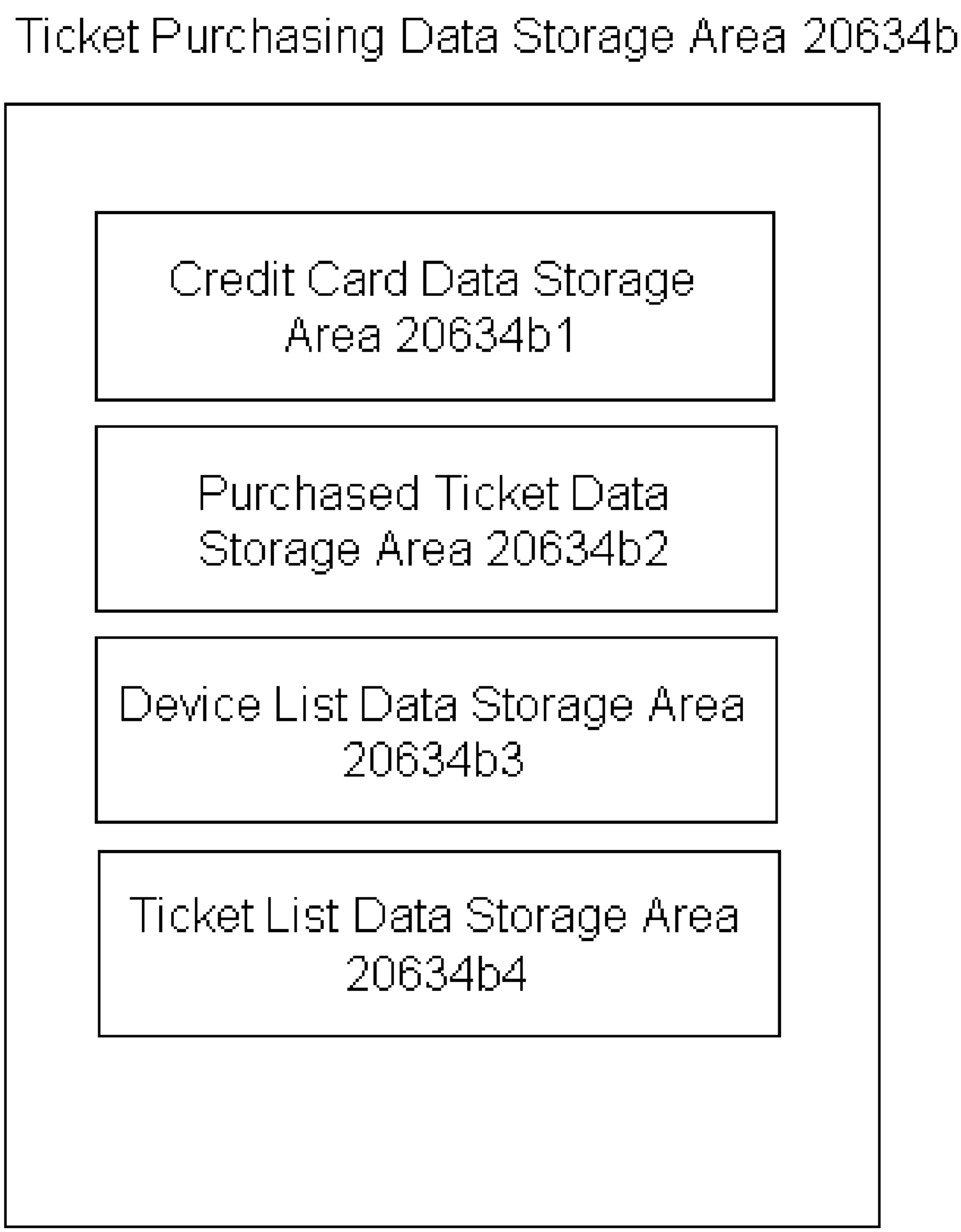

FIG. 734 is a block diagram illustrating an exemplary embodiment of the present invention.

FIG. 735 is a block diagram illustrating an exemplary embodiment of the present invention.

FIG. 736 is a block diagram illustrating an exemplary embodiment of the present invention.

Figure 737:
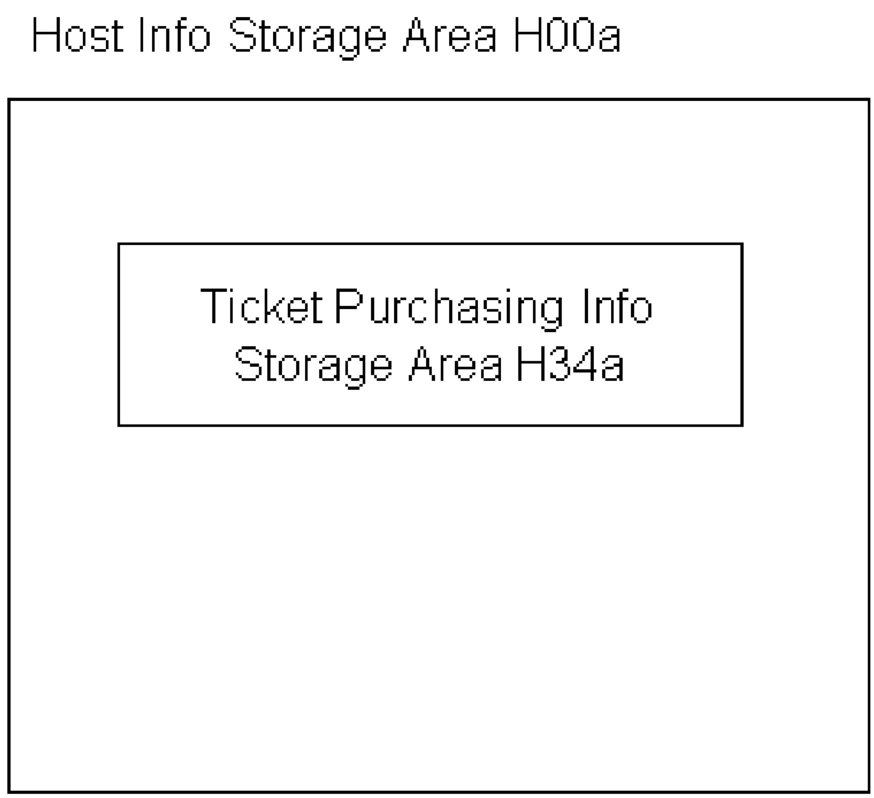

FIG. 737 is a block diagram illustrating an exemplary embodiment of the present invention.

Figure 738:
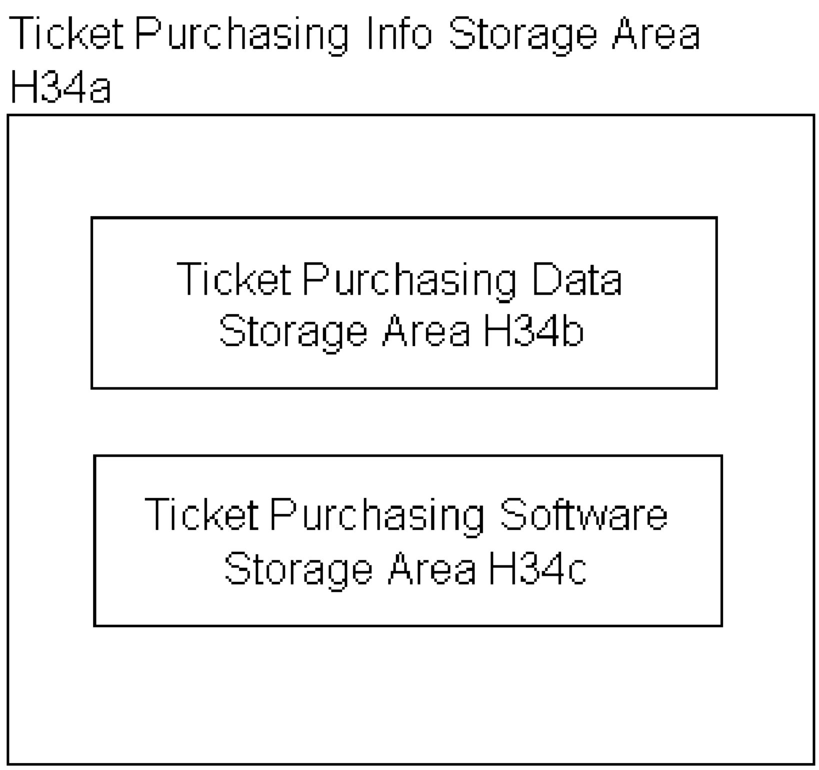

FIG. 738 is a block diagram illustrating an exemplary embodiment of the present invention.

Figure 739:
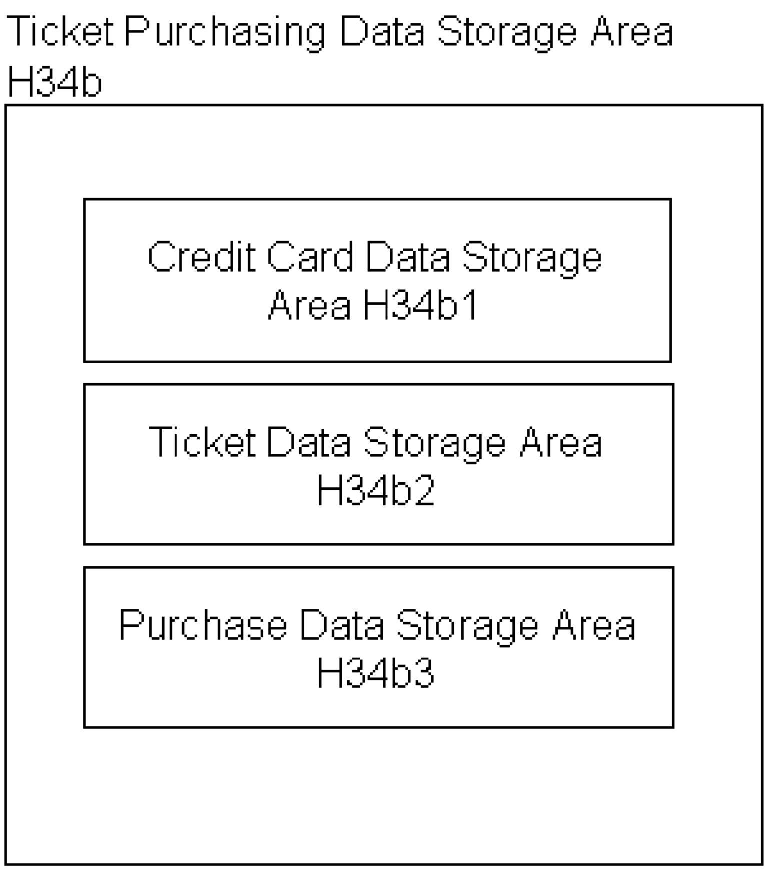

FIG. 739 is a block diagram illustrating an exemplary embodiment of the present invention.

FIG. 740 is a block diagram illustrating an exemplary embodiment of the present invention.

FIG. 741 is a block diagram illustrating an exemplary embodiment of the present invention.

Figure 742:
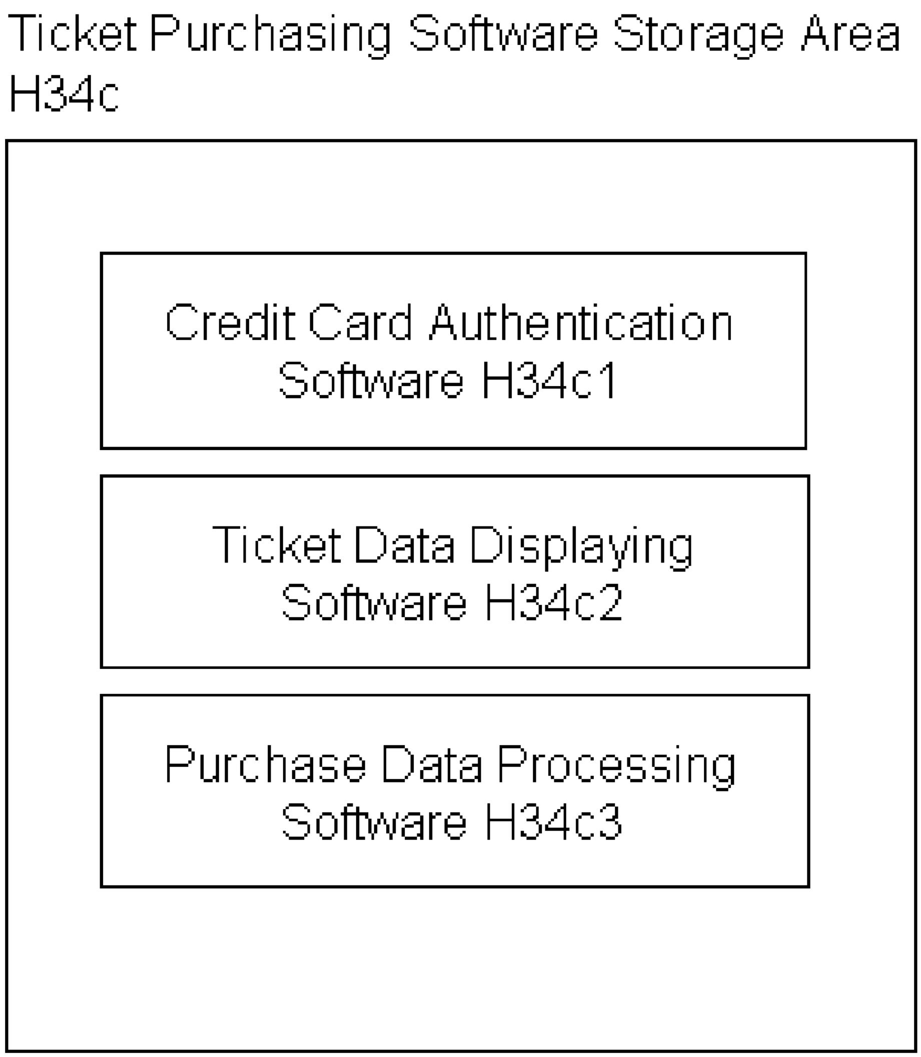

FIG. 742 is a block diagram illustrating an exemplary embodiment of the present invention.

Figure 743:
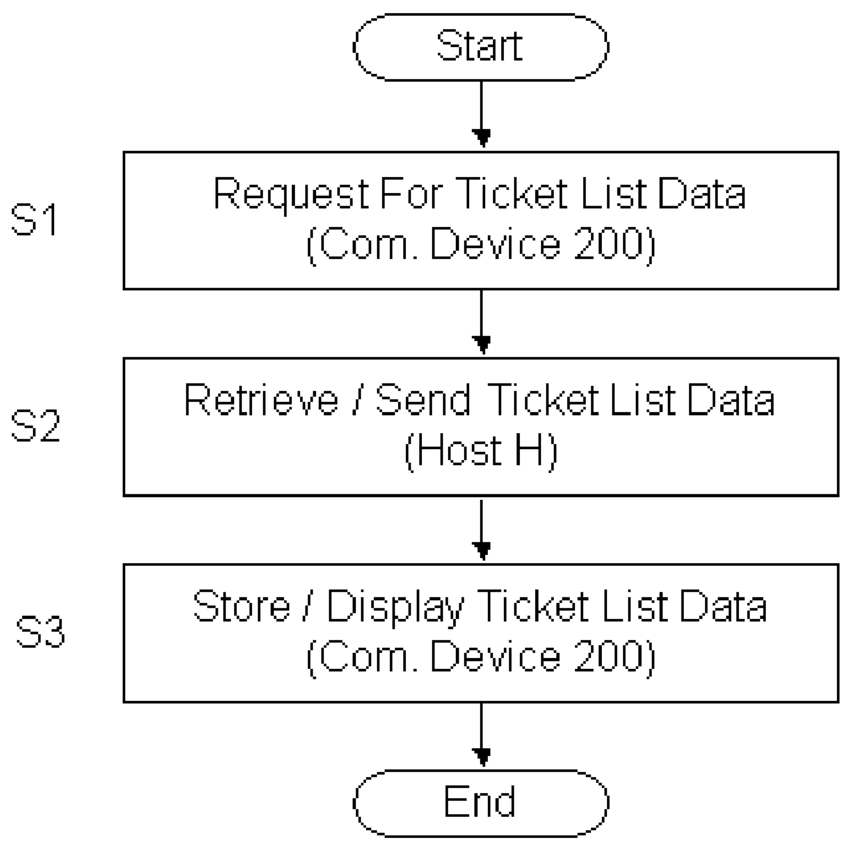

FIG. 743 is a flowchart illustrating an exemplary embodiment of the present invention.

Figure 744:
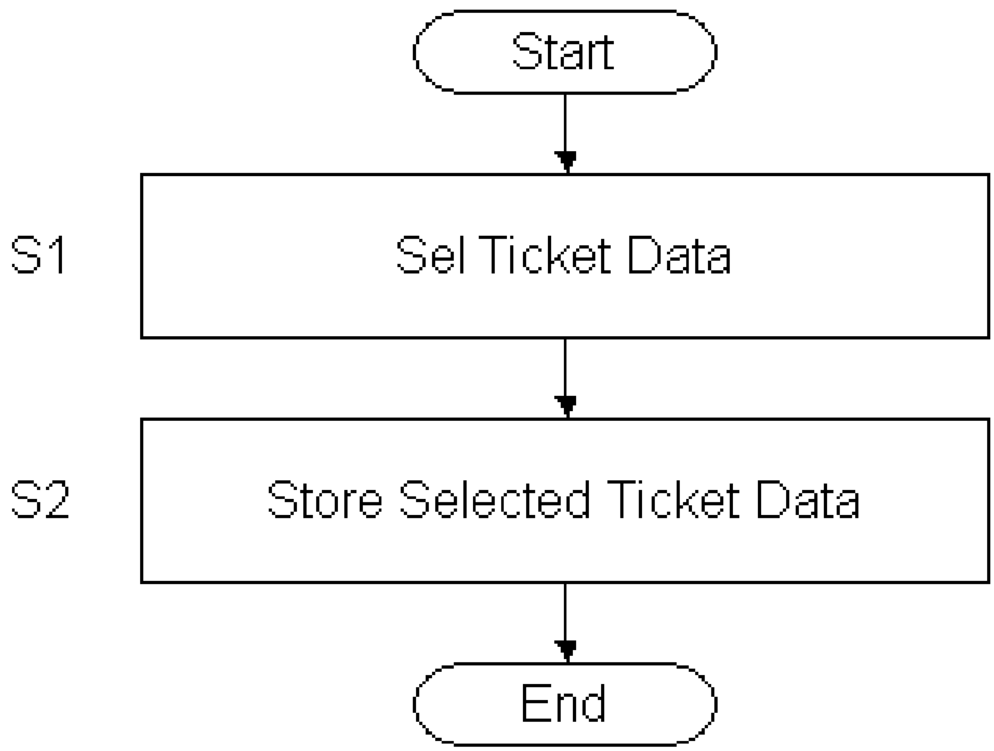

FIG. 744 is a flowchart illustrating an exemplary embodiment of the present invention.

Figure 745:
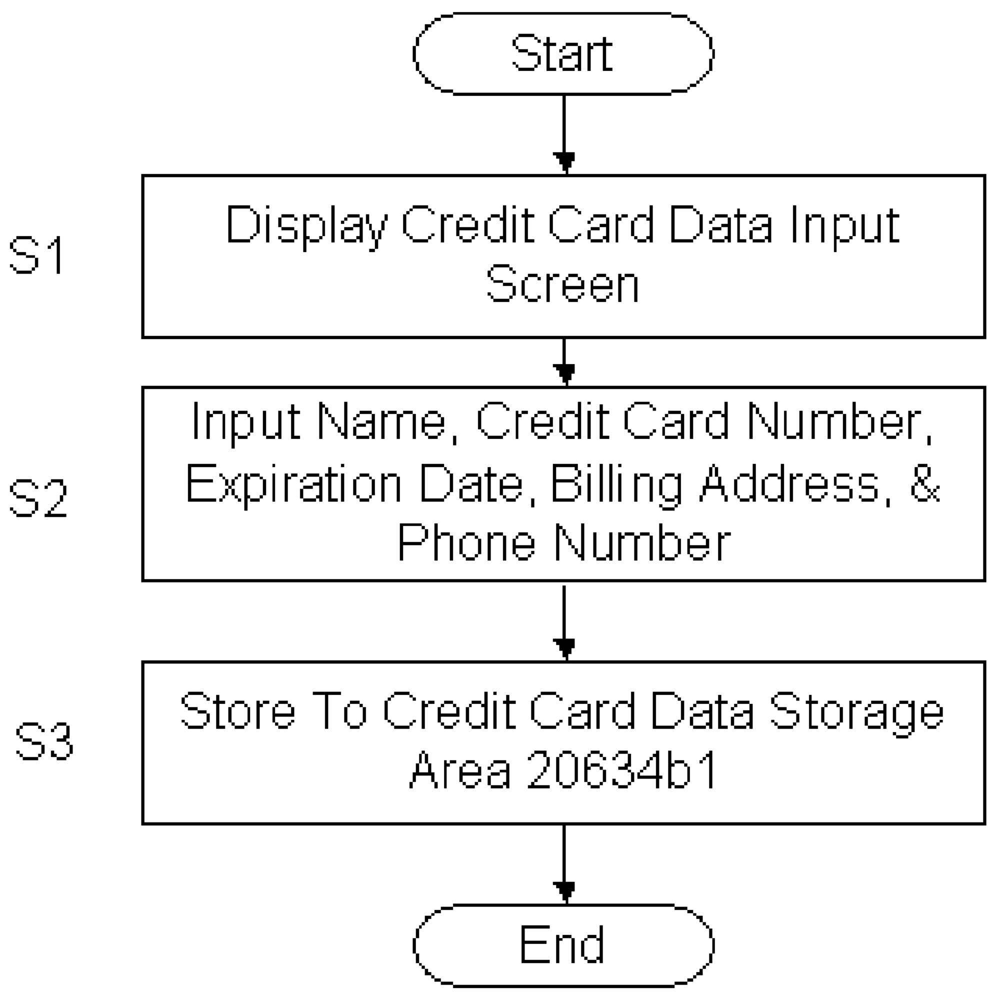

FIG. 745 is a flowchart illustrating an exemplary embodiment of the present invention.

Figure 746:
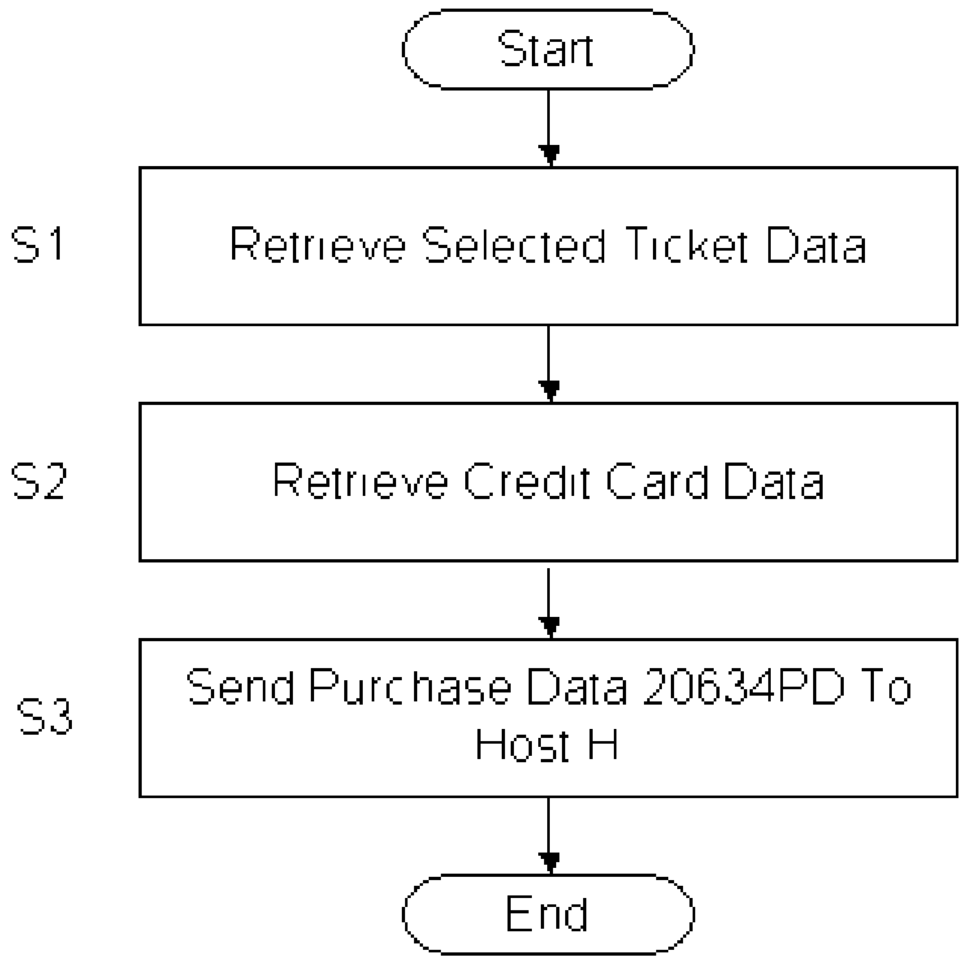

FIG. 746 is a flowchart illustrating an exemplary embodiment of the present invention.

Figure 747:
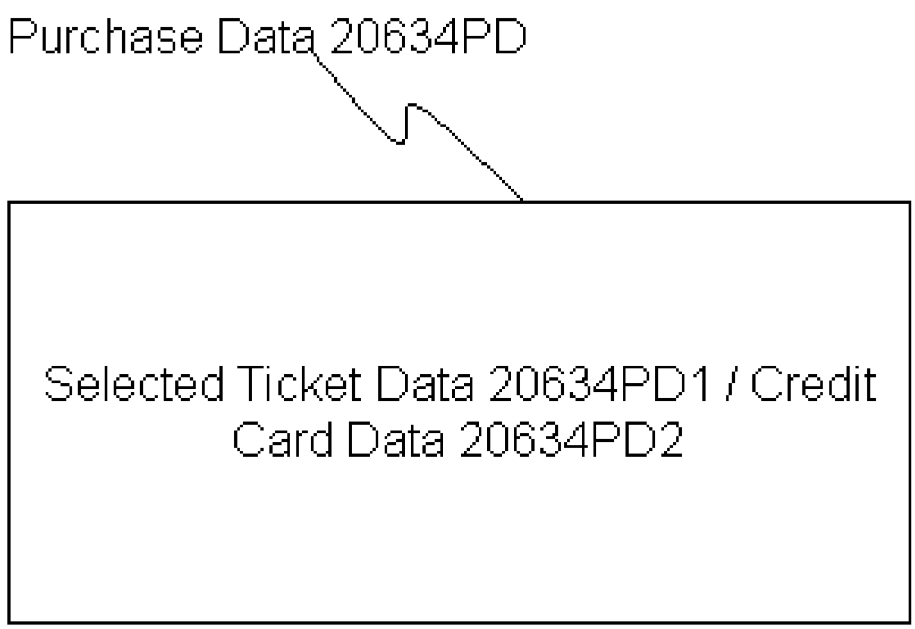

FIG. 747 is a simplified illustration of data utilized in the present invention.

Figure 748:
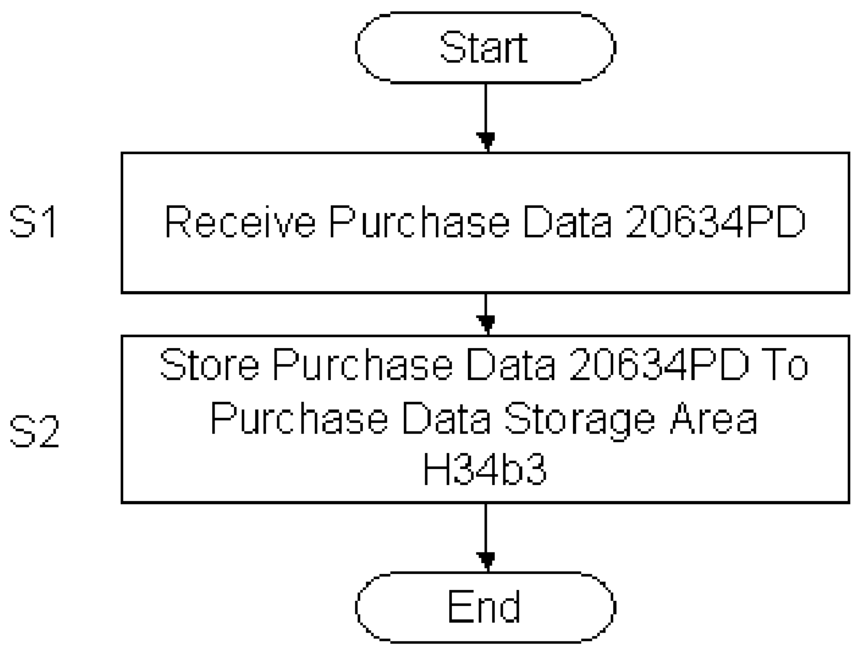

FIG. 748 is a flowchart illustrating an exemplary embodiment of the present invention.

Figure 749:
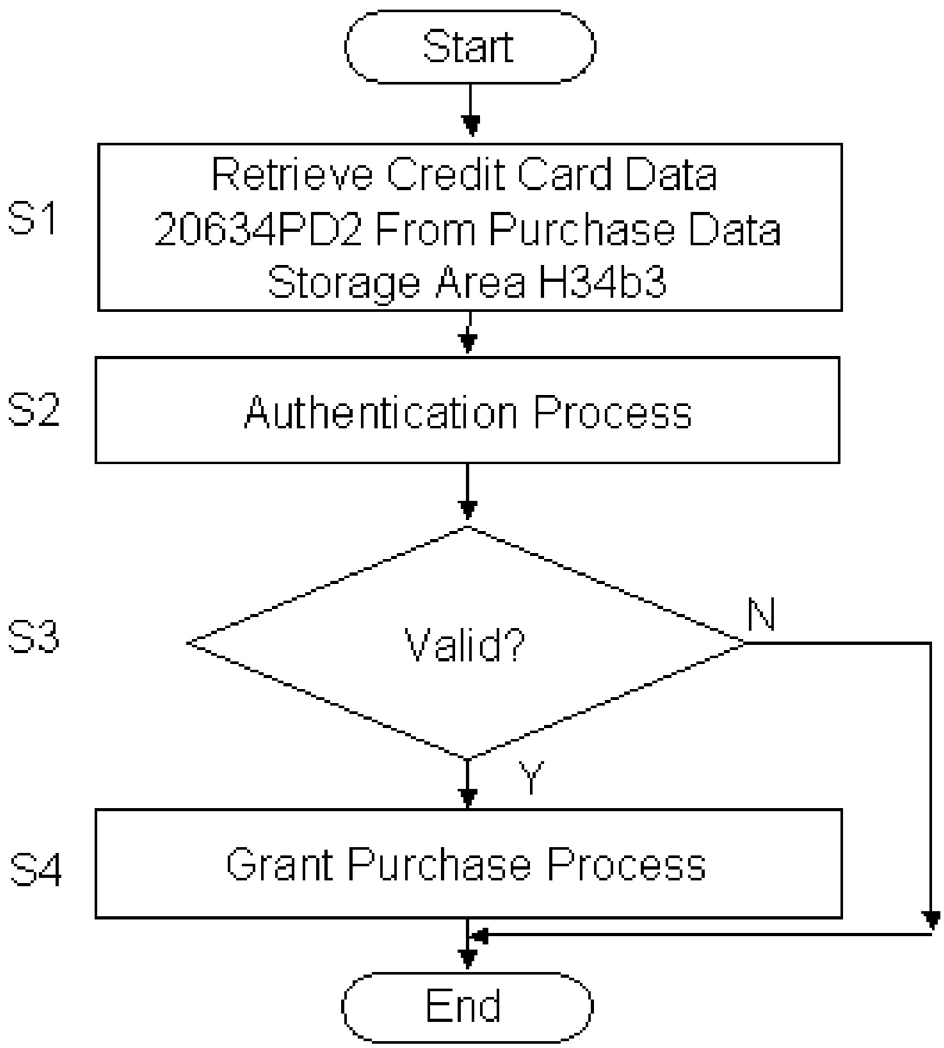

FIG. 749 is a flowchart illustrating an exemplary embodiment of the present invention.

Figure 750:
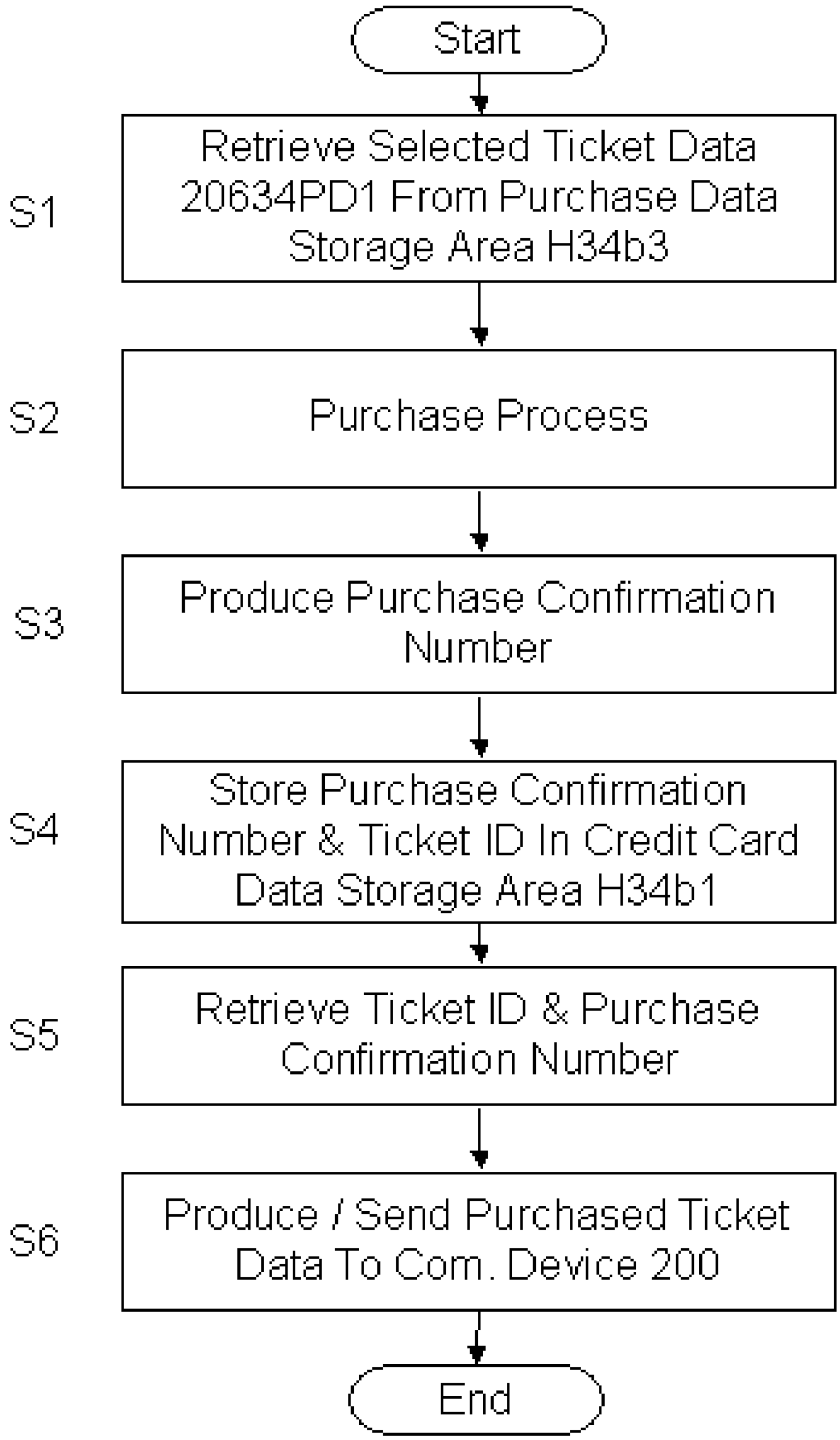

FIG. 750 is a flowchart illustrating an exemplary embodiment of the present invention.

Figure 751:
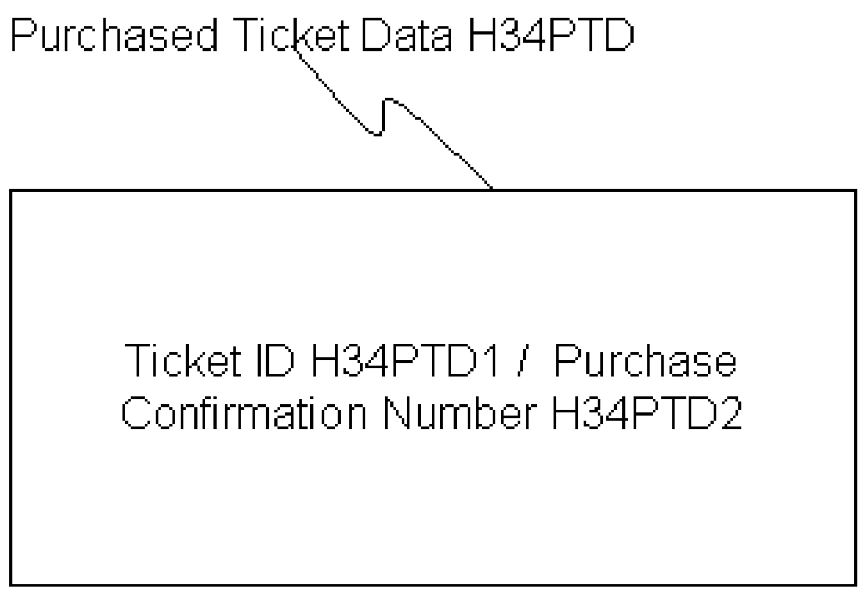

FIG. 751 is a simplified illustration of data utilized in the present invention.

Figure 752:
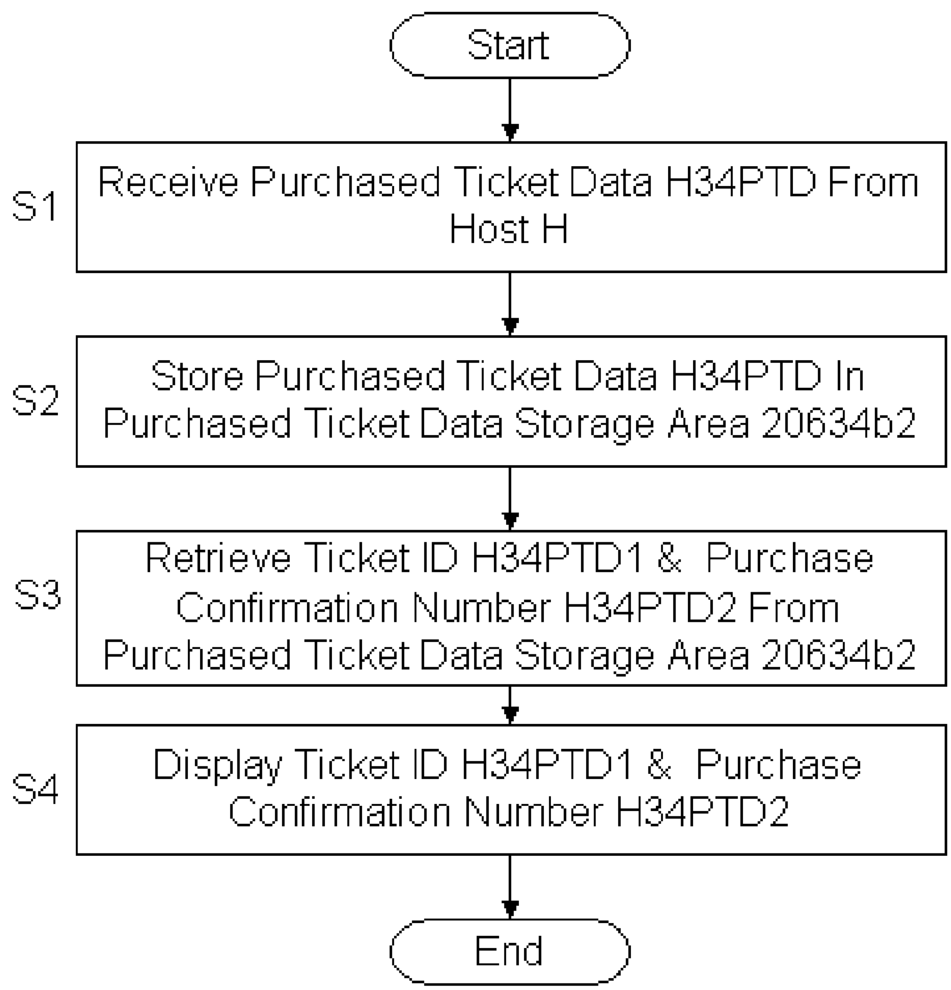

FIG. 752 is a flowchart illustrating an exemplary embodiment of the present invention.

Figure 753:
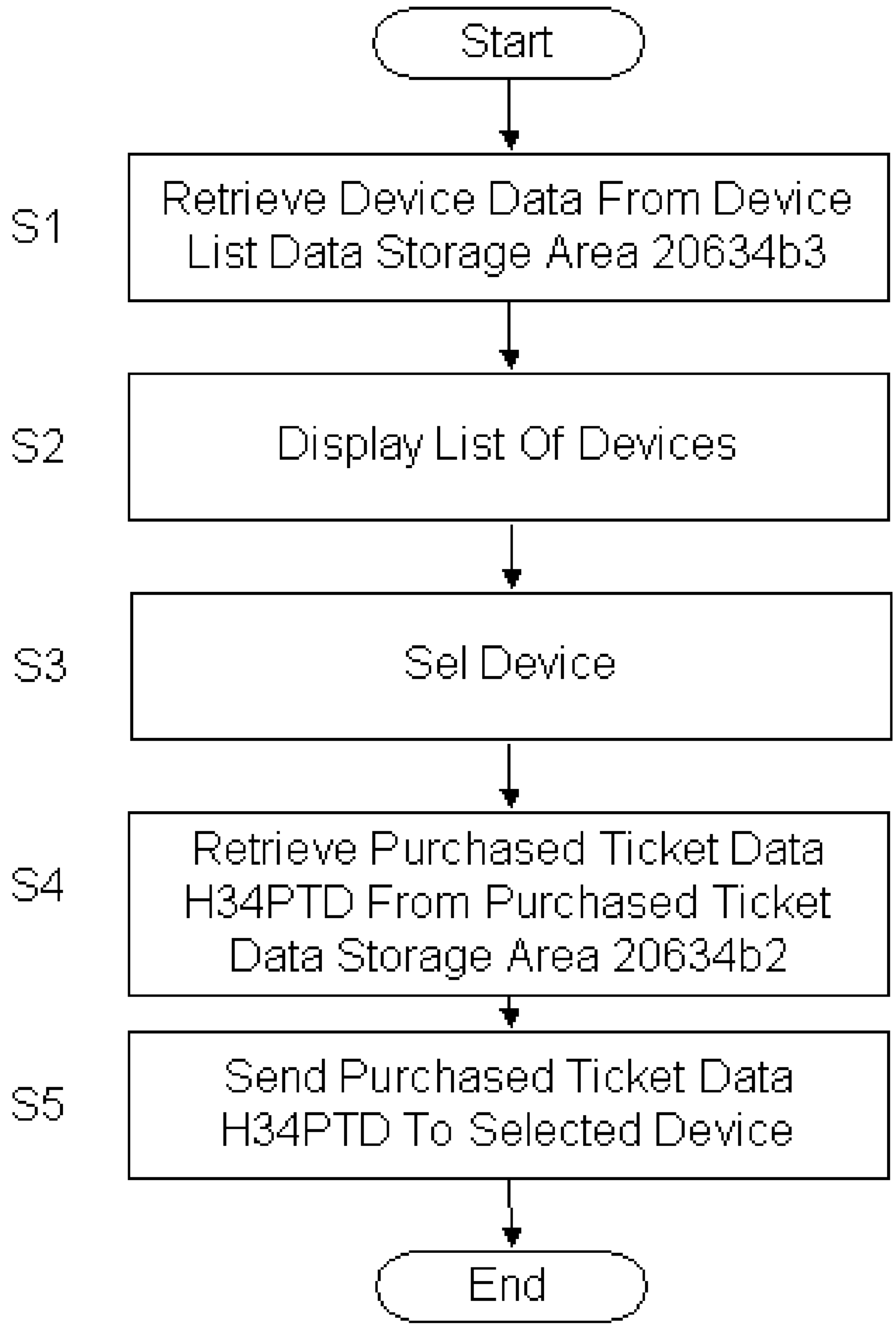

FIG. 753 is a flowchart illustrating an exemplary embodiment of the present invention.

Figure 754:
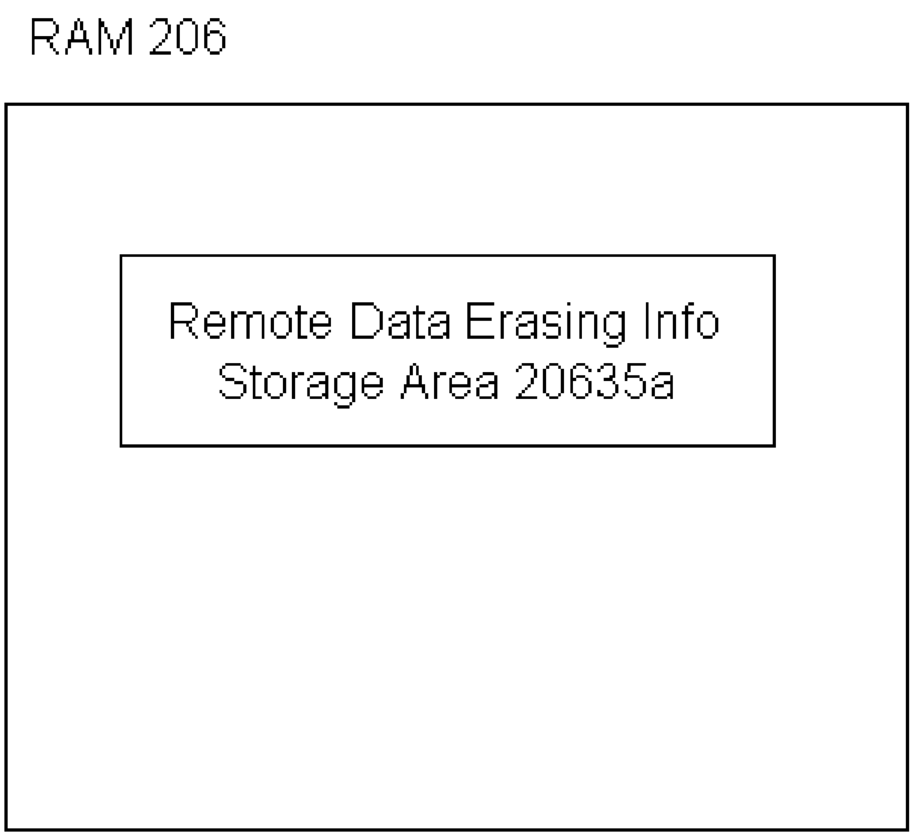

FIG. 754 is a block diagram illustrating an exemplary embodiment of the present invention.

Figure 755:
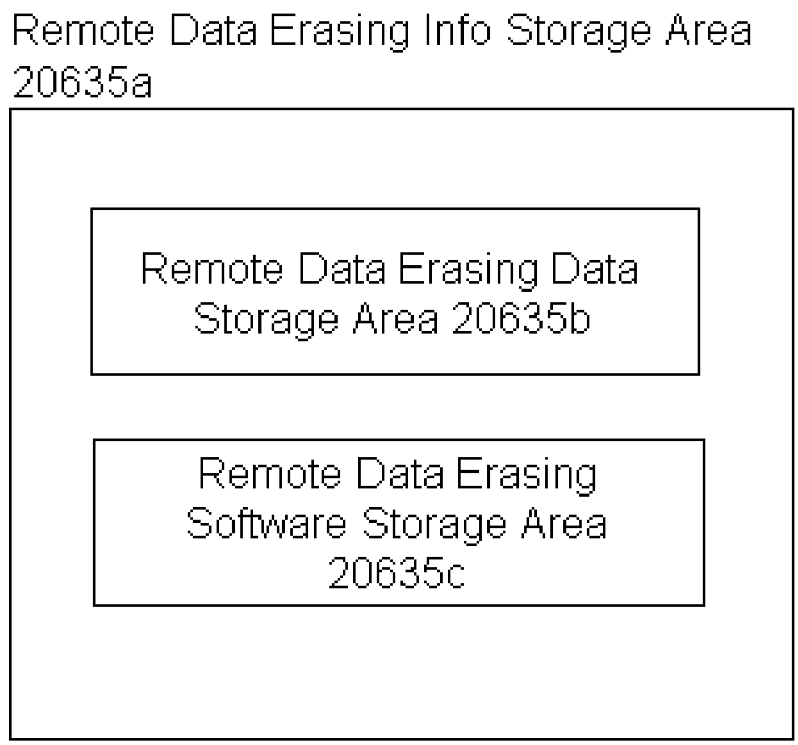

FIG. 755 is a block diagram illustrating an exemplary embodiment of the present invention.

Figure 756:
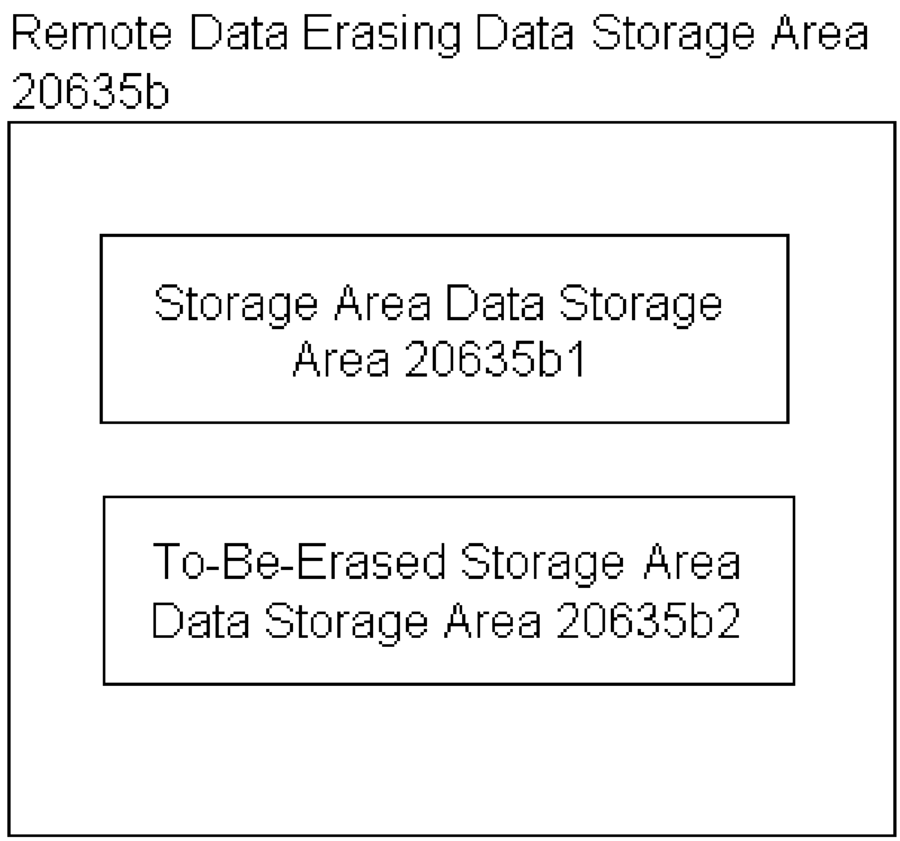

FIG. 756 is a block diagram illustrating an exemplary embodiment of the present invention.

Figure 757:
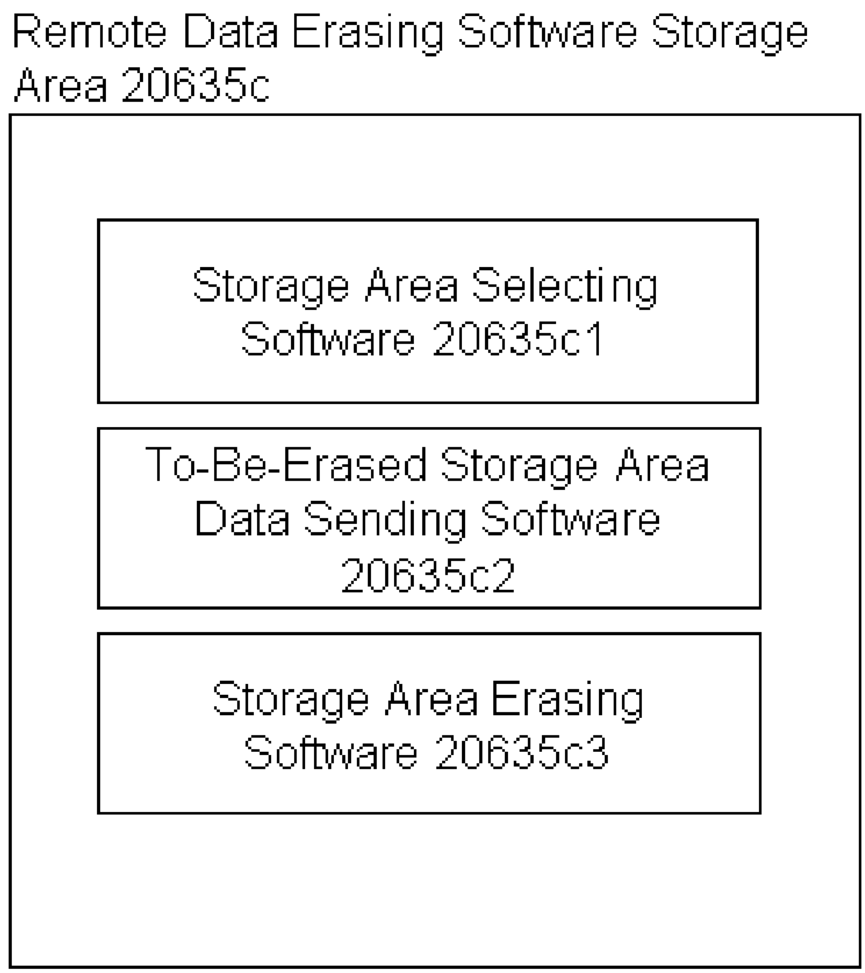

FIG. 757 is a block diagram illustrating an exemplary embodiment of the present invention.

Figure 758:
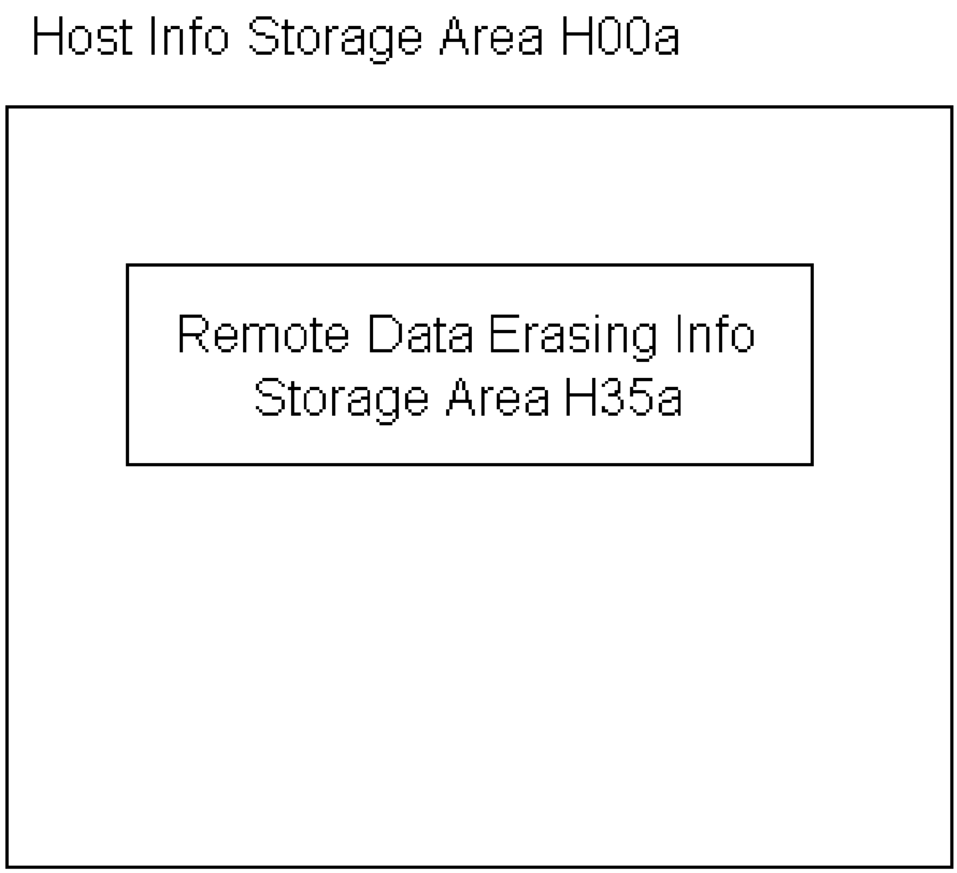

FIG. 758 is a block diagram illustrating an exemplary embodiment of the present invention.

Figure 759:
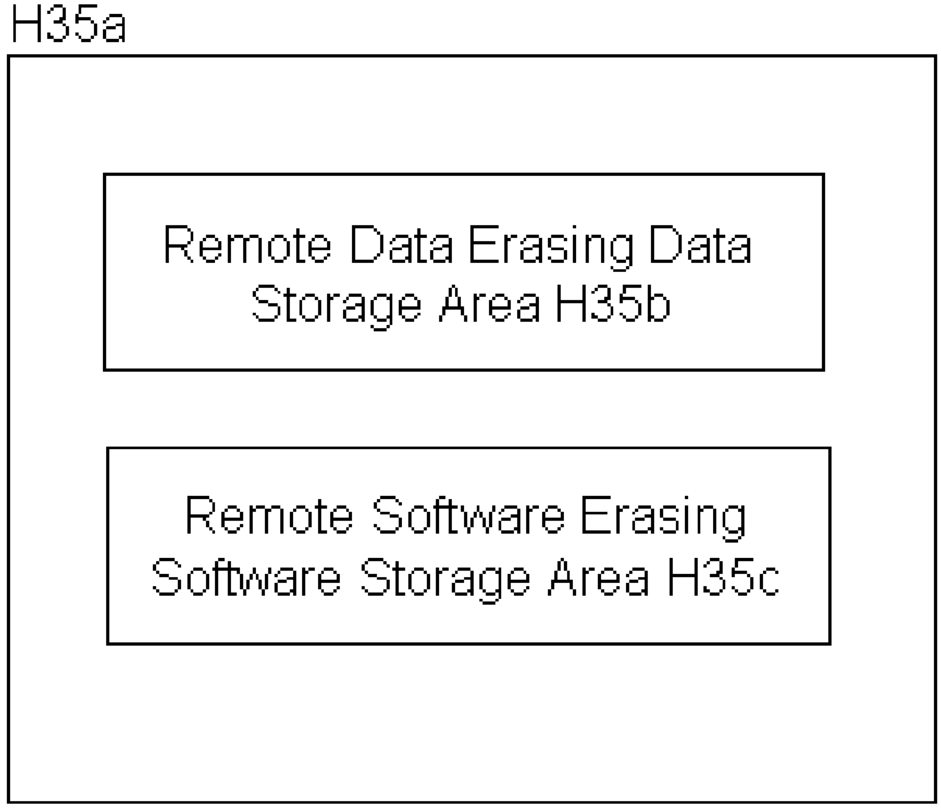

FIG. 759 is a block diagram illustrating an exemplary embodiment of the present invention.

Figure 760:
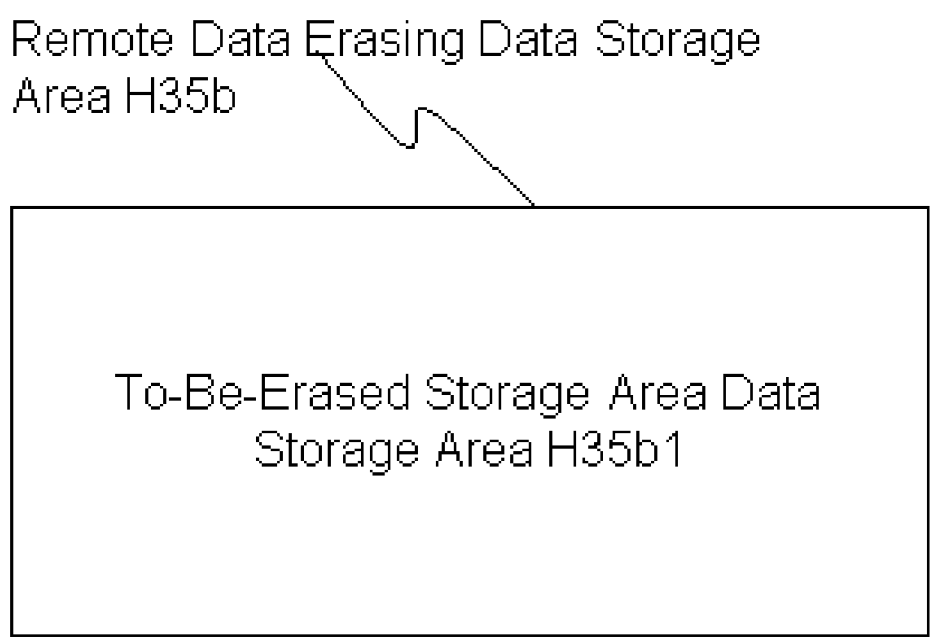

FIG. 760 is a block diagram illustrating an exemplary embodiment of the present invention.

FIG. 761 is a block diagram illustrating an exemplary embodiment of the present invention.

Figure 762:
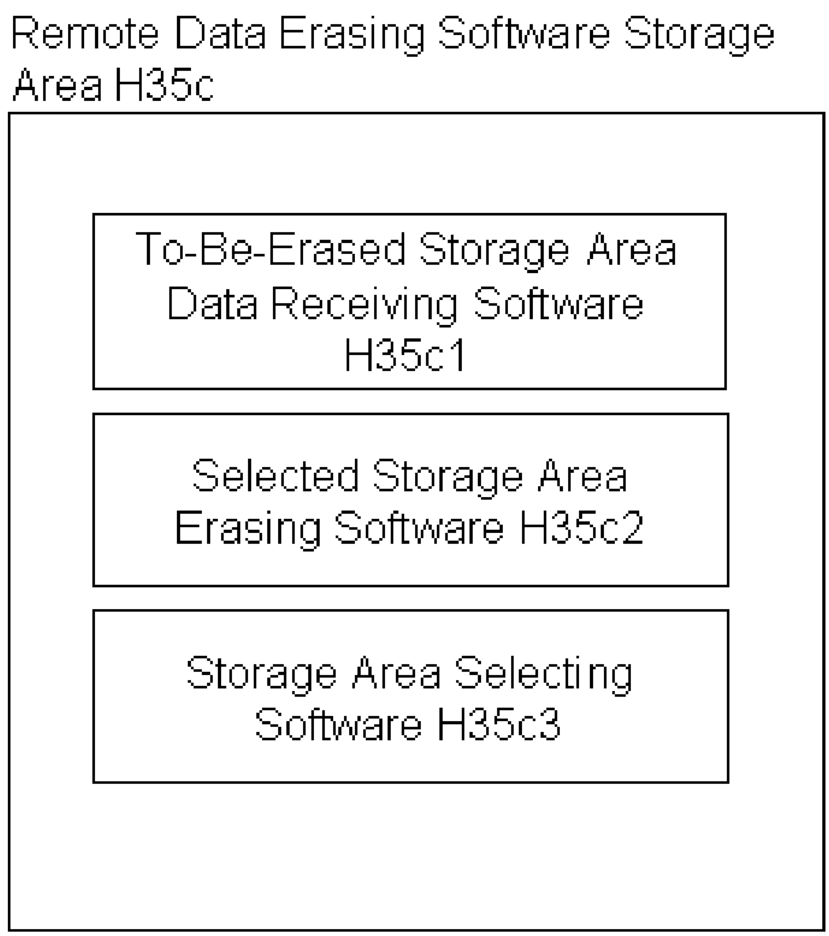

FIG. 762 is a block diagram illustrating an exemplary embodiment of the present invention.

Figure 763:
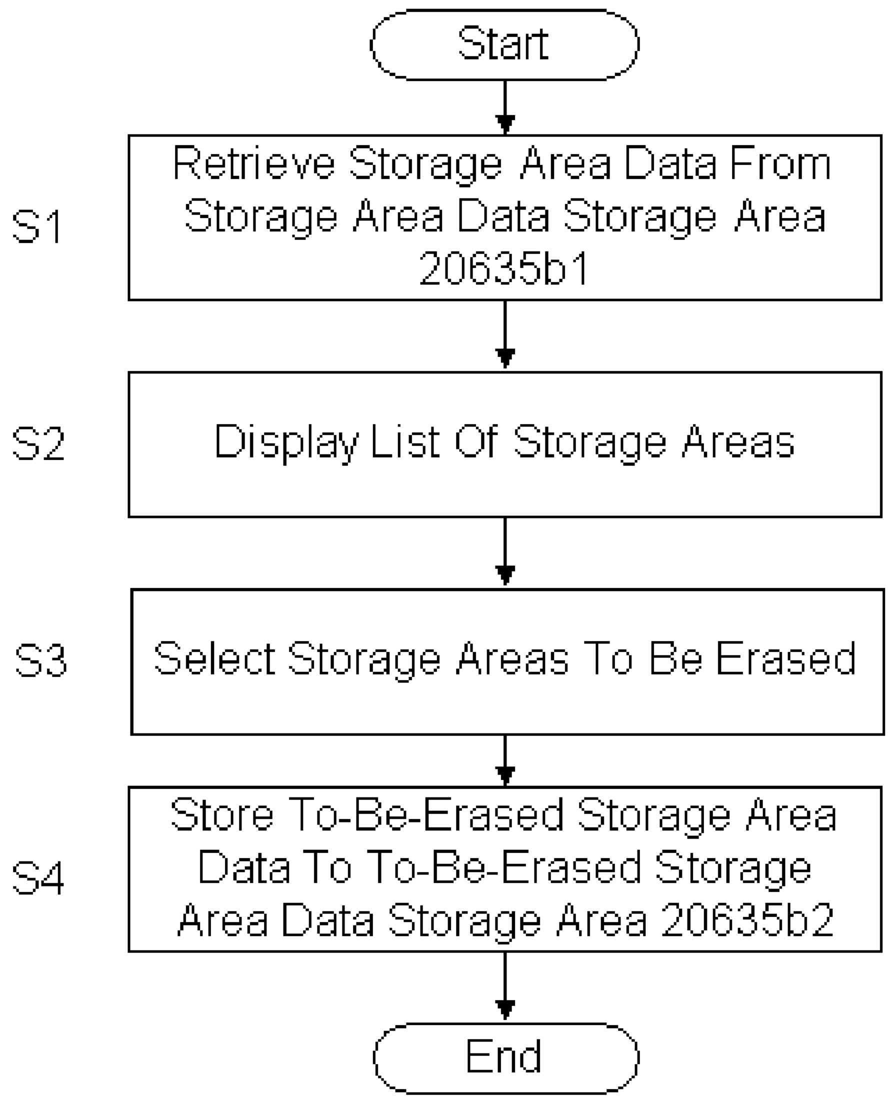

FIG. 763 is a flowchart illustrating an exemplary embodiment of the present invention.

Figure 764:
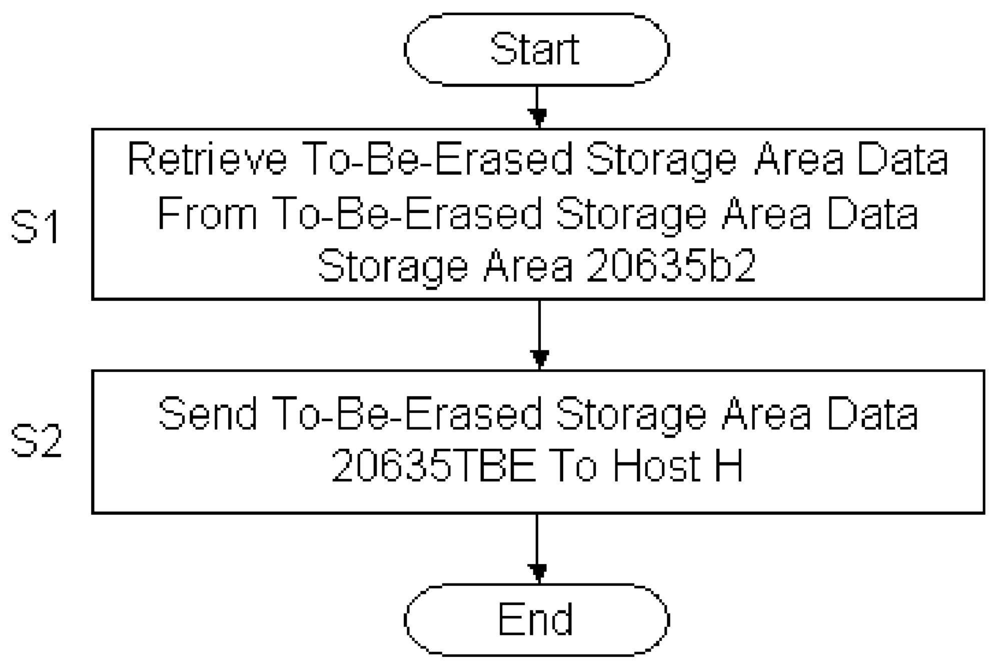

FIG. 764 is a flowchart illustrating an exemplary embodiment of the present invention.

Figure 765:
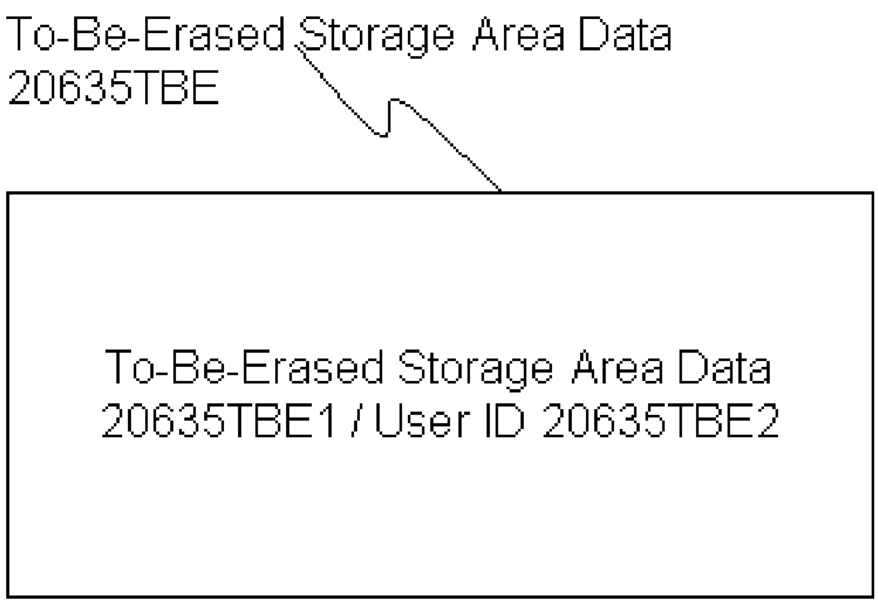

FIG. 765 is a simplified illustration of data utilized in the present invention.

Figure 766:
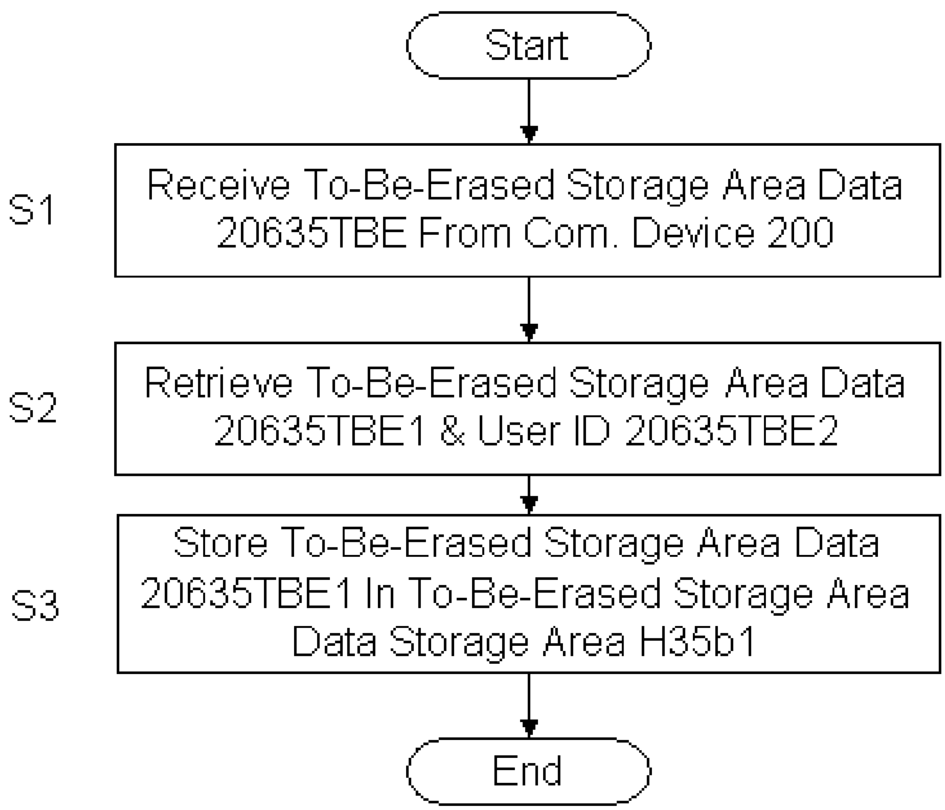

FIG. 766 is a flowchart illustrating an exemplary embodiment of the present invention.

Figure 767:
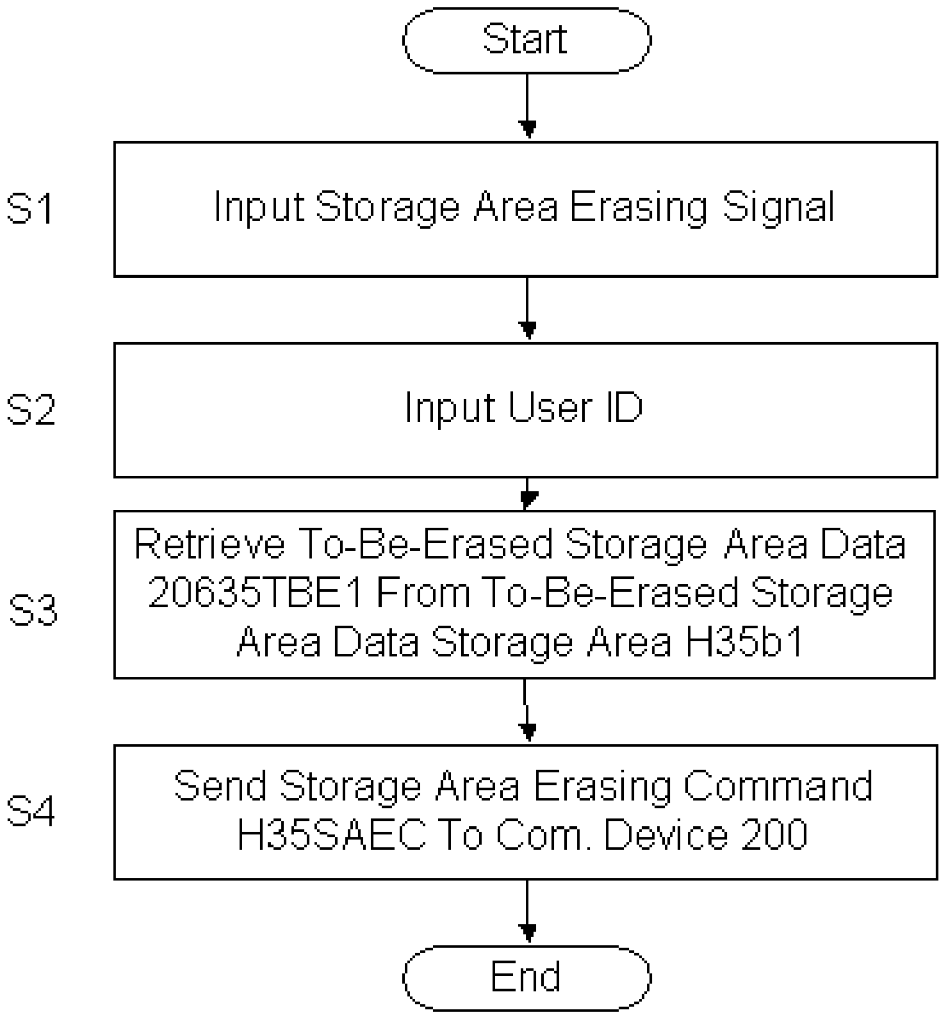

FIG. 767 is a flowchart illustrating an exemplary embodiment of the present invention.

Figure 768:
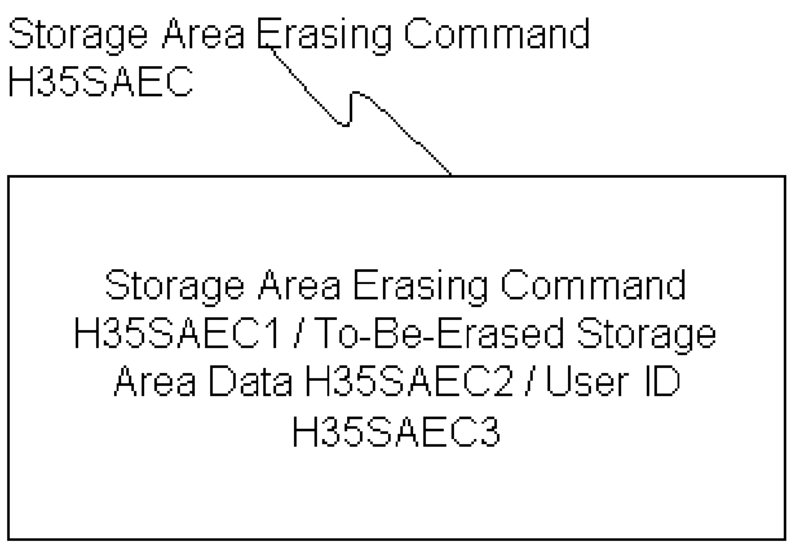

FIG. 768 is a simplified illustration of data utilized in the present invention.

Figure 769:
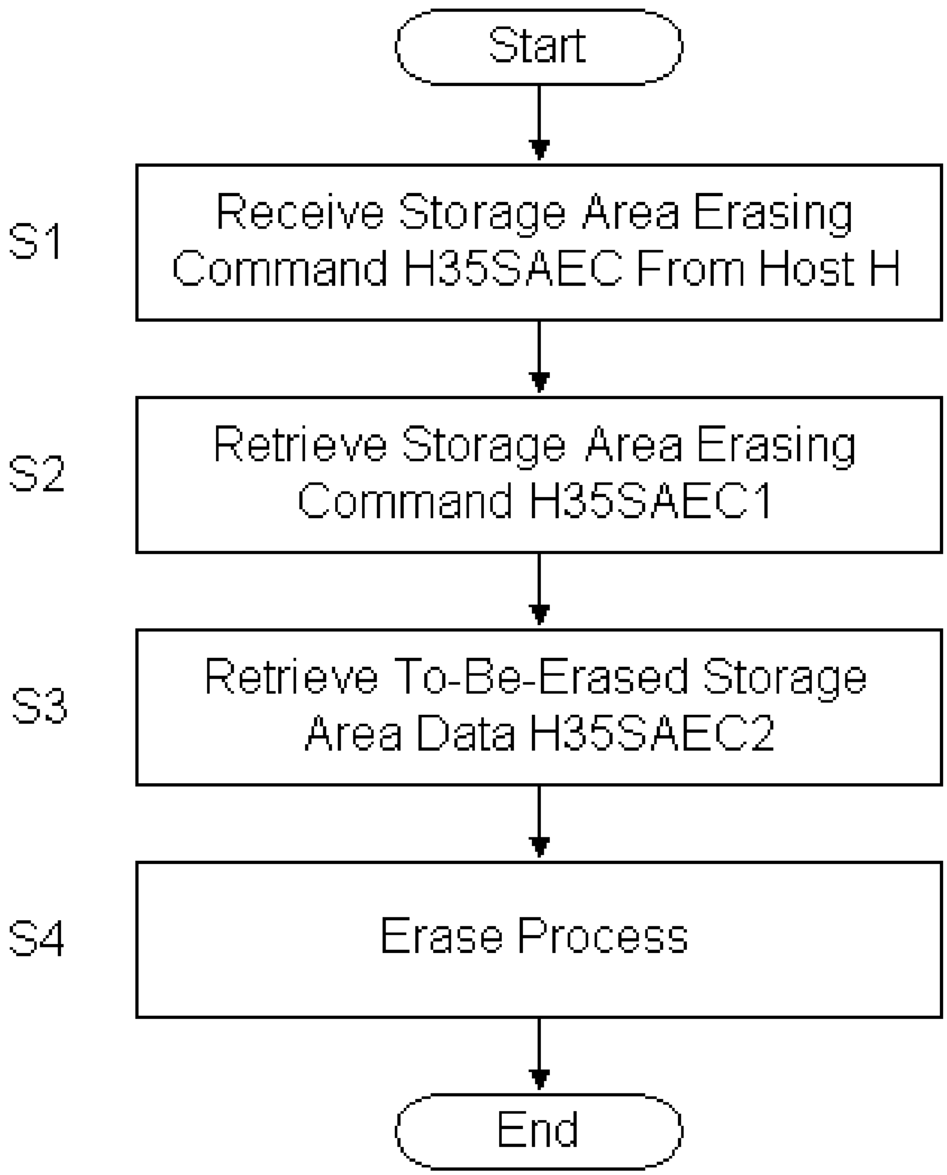

FIG. 769 is a flowchart illustrating an exemplary embodiment of the present invention.

Figure 770:
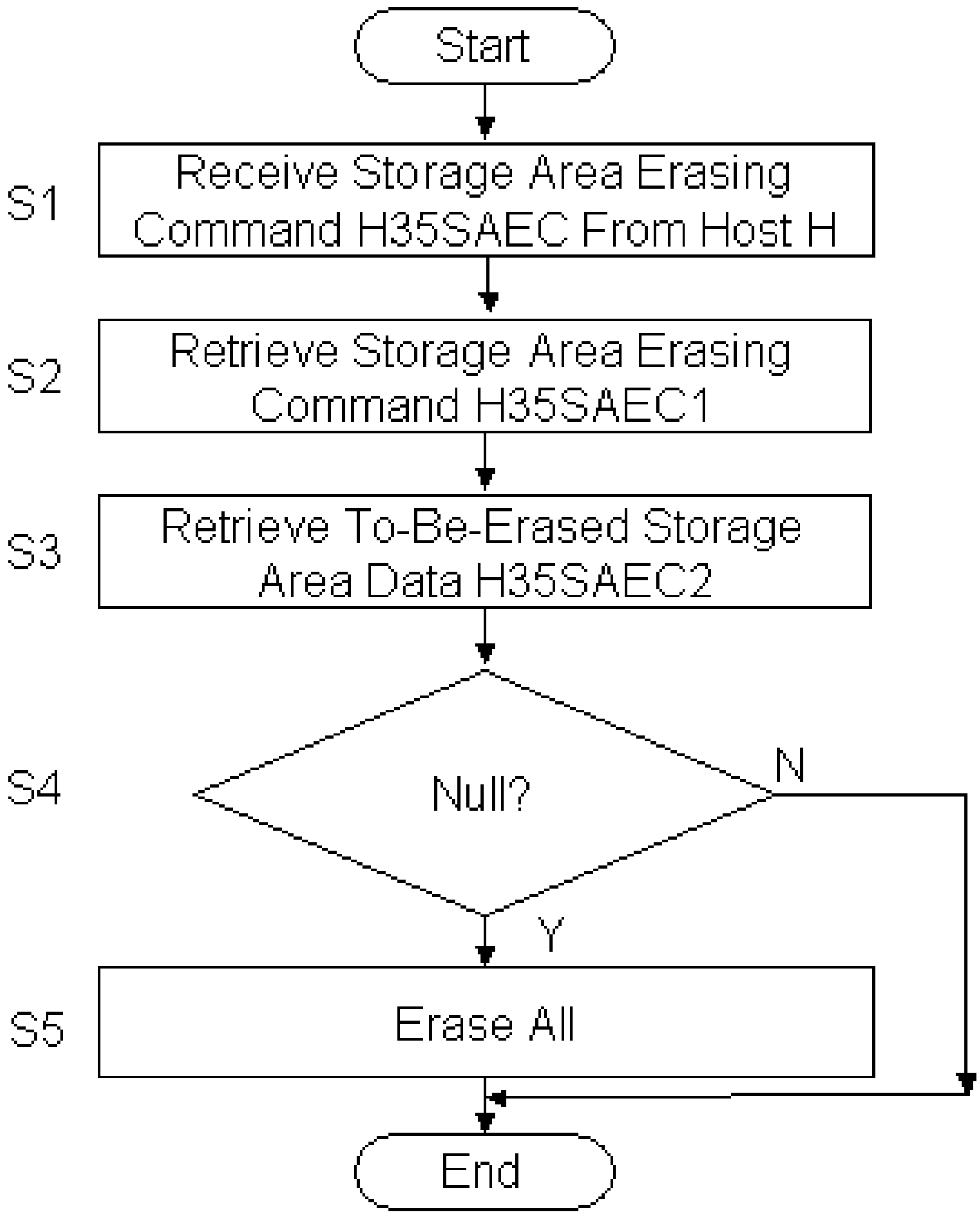

FIG. 770 is a flowchart illustrating an exemplary embodiment of the present invention.

Figure 771:
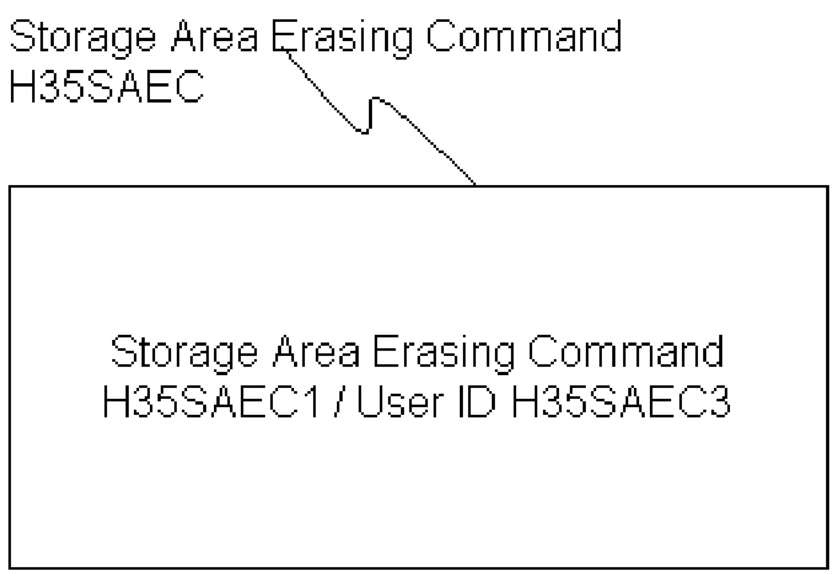

FIG. 771 is a simplified illustration of data utilized in the present invention.

Figure 772:
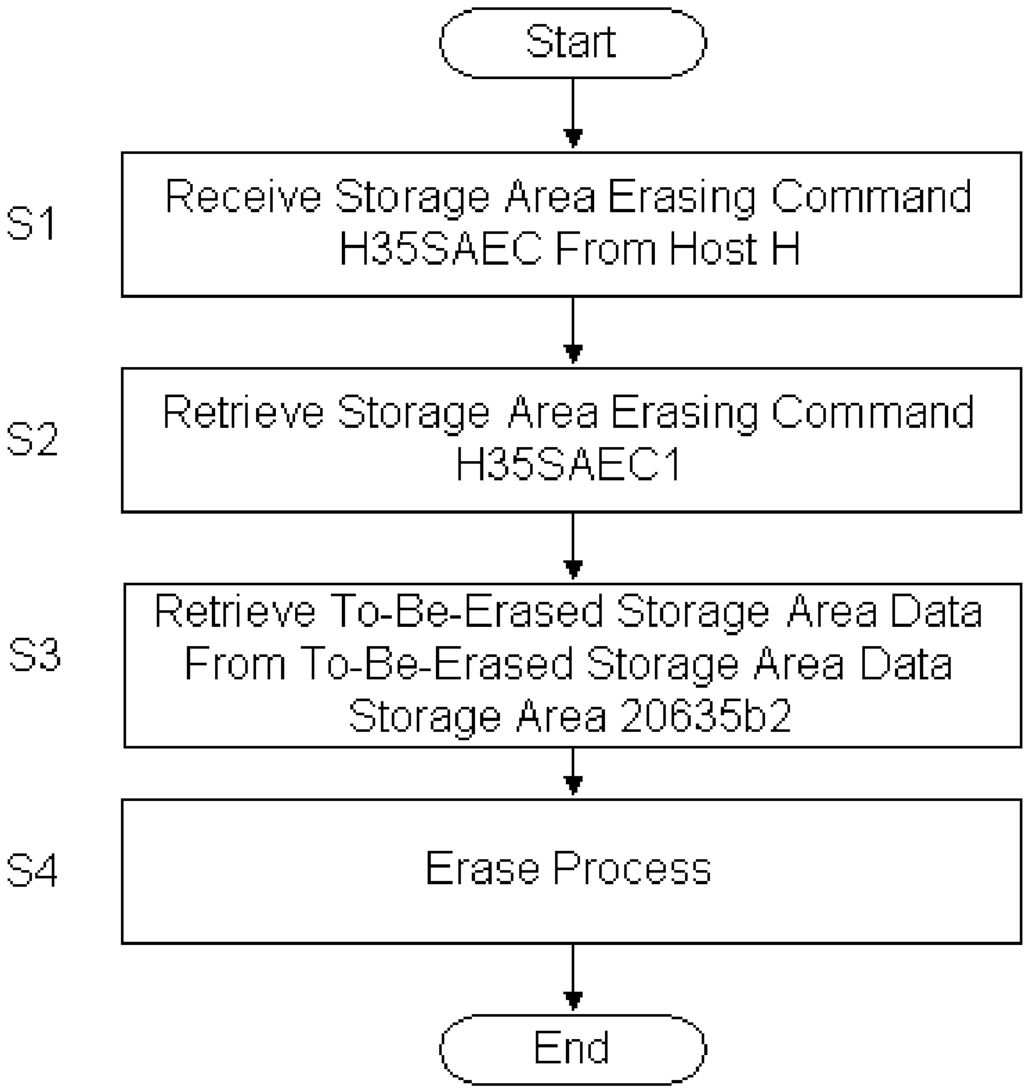

FIG. 772 is a flowchart illustrating an exemplary embodiment of the present invention.

Figure 773:
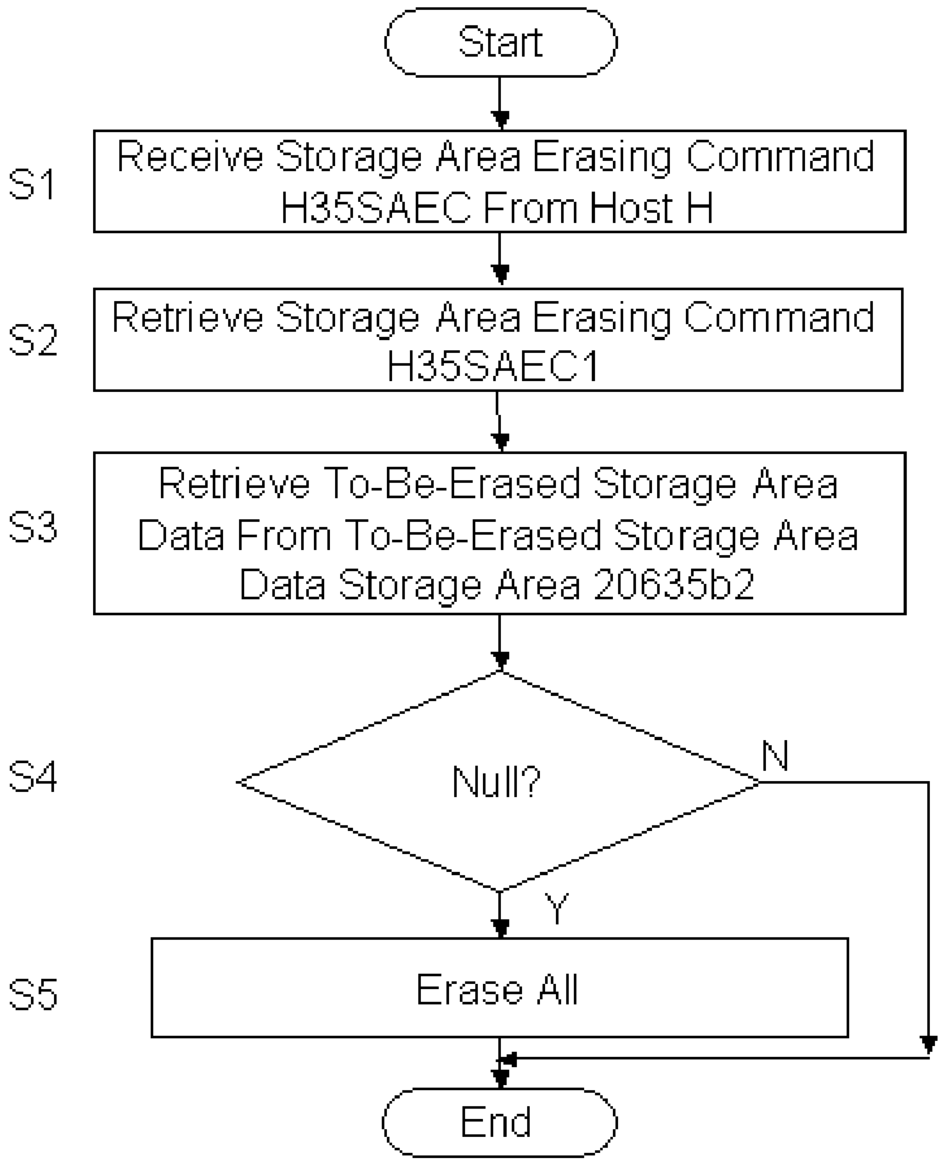

FIG. 773 is a flowchart illustrating an exemplary embodiment of the present invention.

Figure 774:
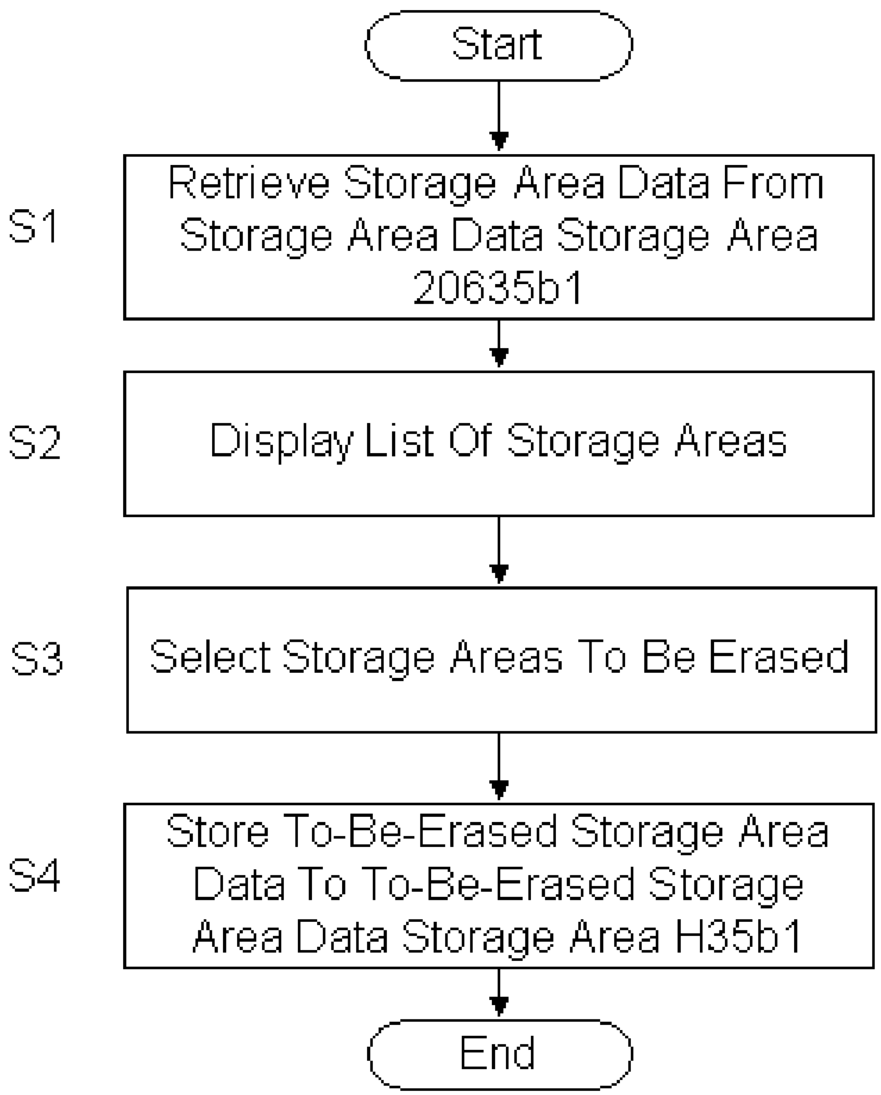

FIG. 774 is a flowchart illustrating an exemplary embodiment of the present invention.

Figure 775:
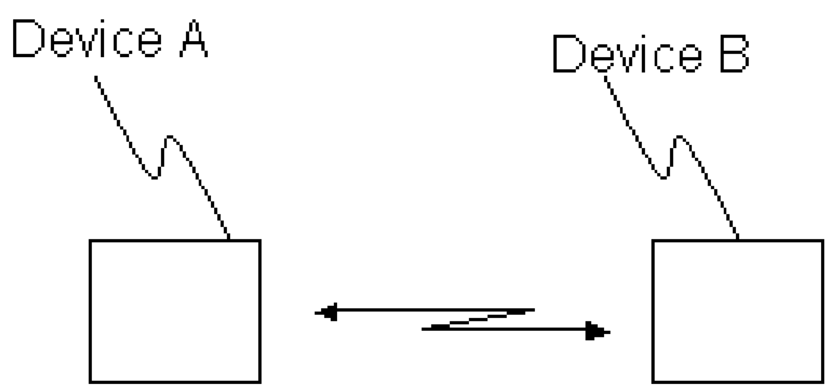

FIG. 775 is a simplified illustration illustrating an exemplary embodiment of the present invention.

Figure 776:
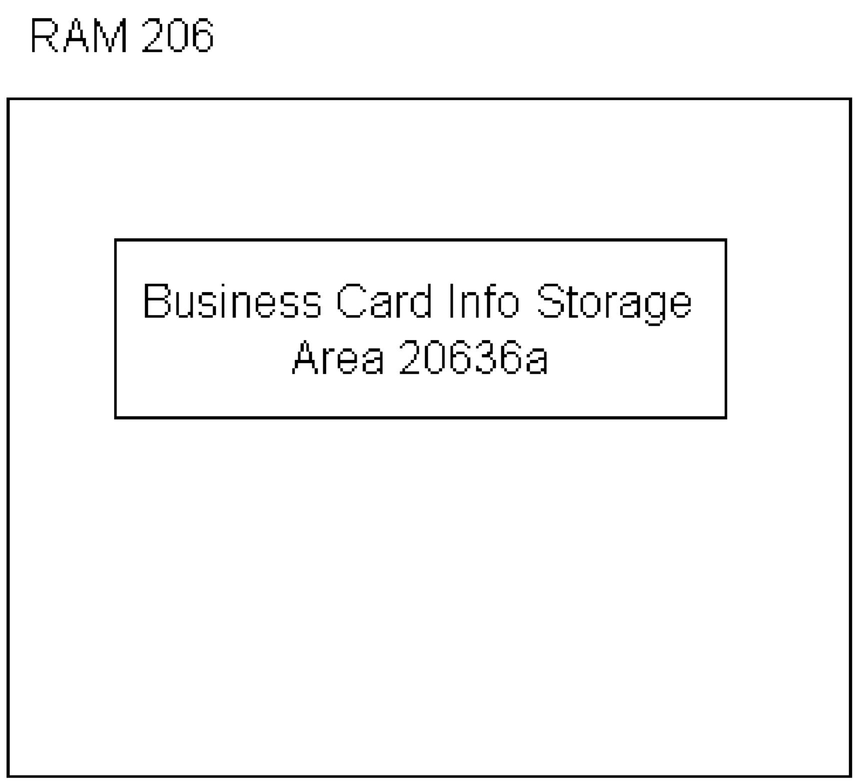

FIG. 776 is a block diagram illustrating an exemplary embodiment of the present invention.

Figure 777:
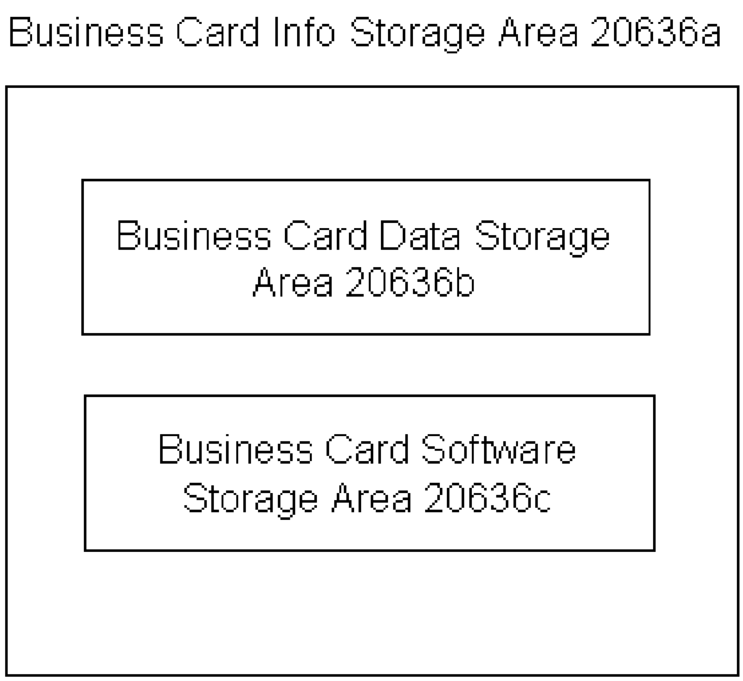

FIG. 777 is a block diagram illustrating an exemplary embodiment of the present invention.

Figure 778:
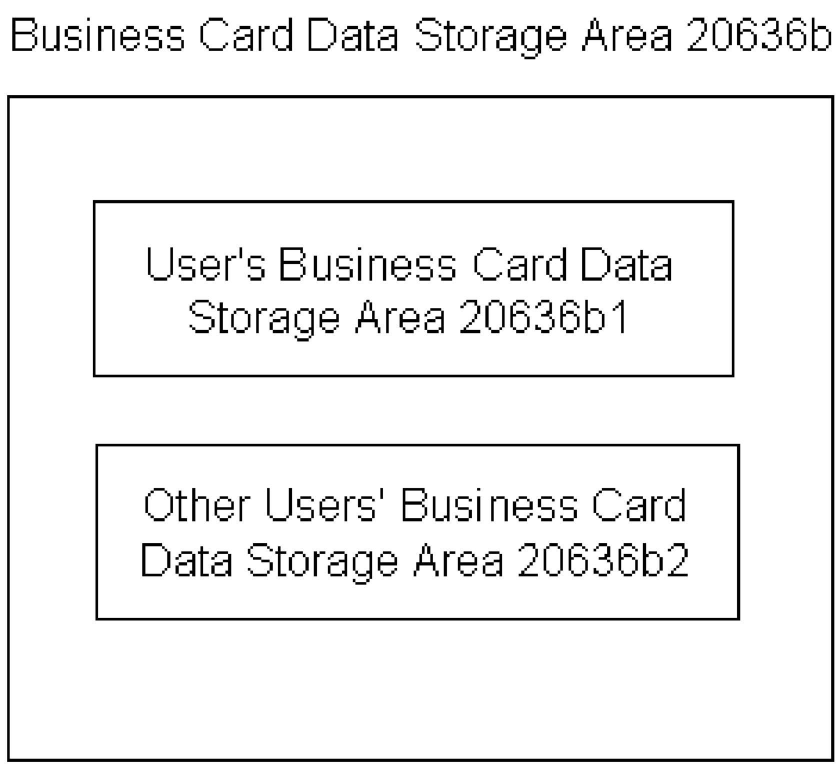

FIG. 778 is a block diagram illustrating an exemplary embodiment of the present invention.

FIG. 779 is a block diagram illustrating an exemplary embodiment of the present invention.

FIG. 780 is a block diagram illustrating an exemplary embodiment of the present invention.

Figure 781:
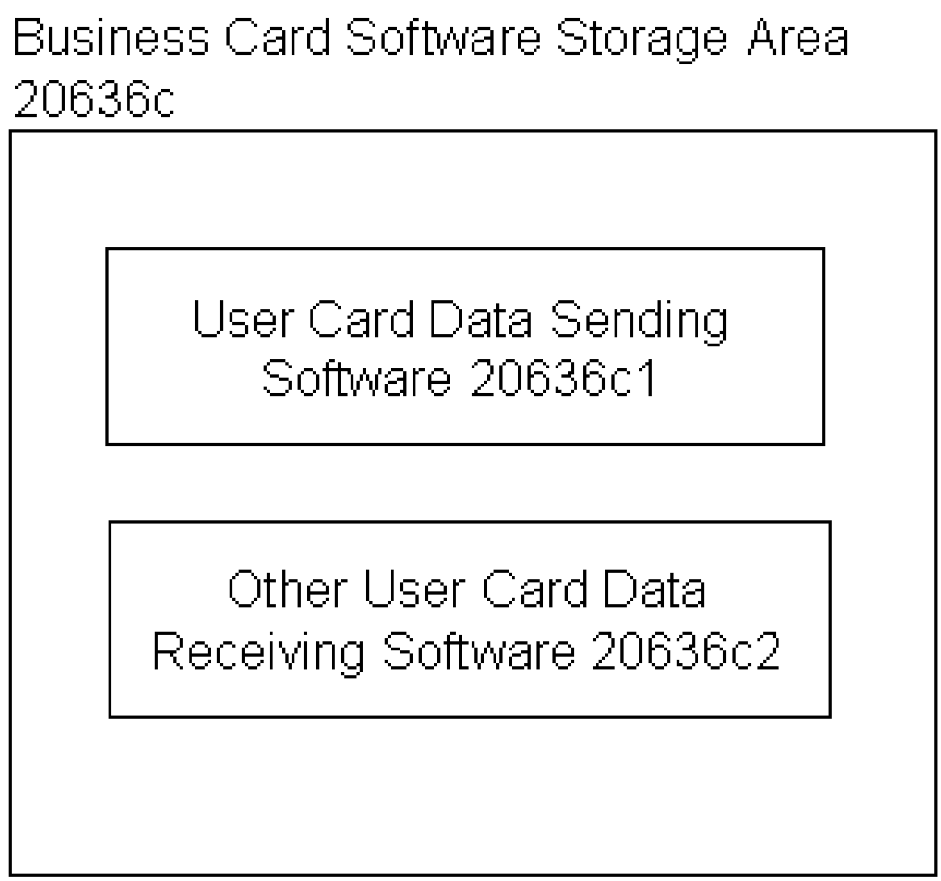

FIG. 781 is a block diagram illustrating an exemplary embodiment of the present invention.

Figure 782:
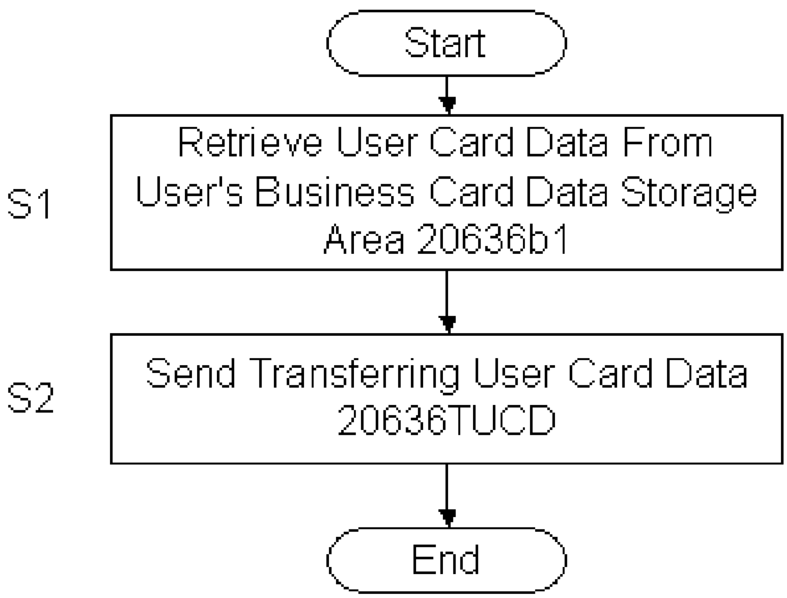

FIG. 782 is a flowchart illustrating an exemplary embodiment of the present invention.

Figure 783:
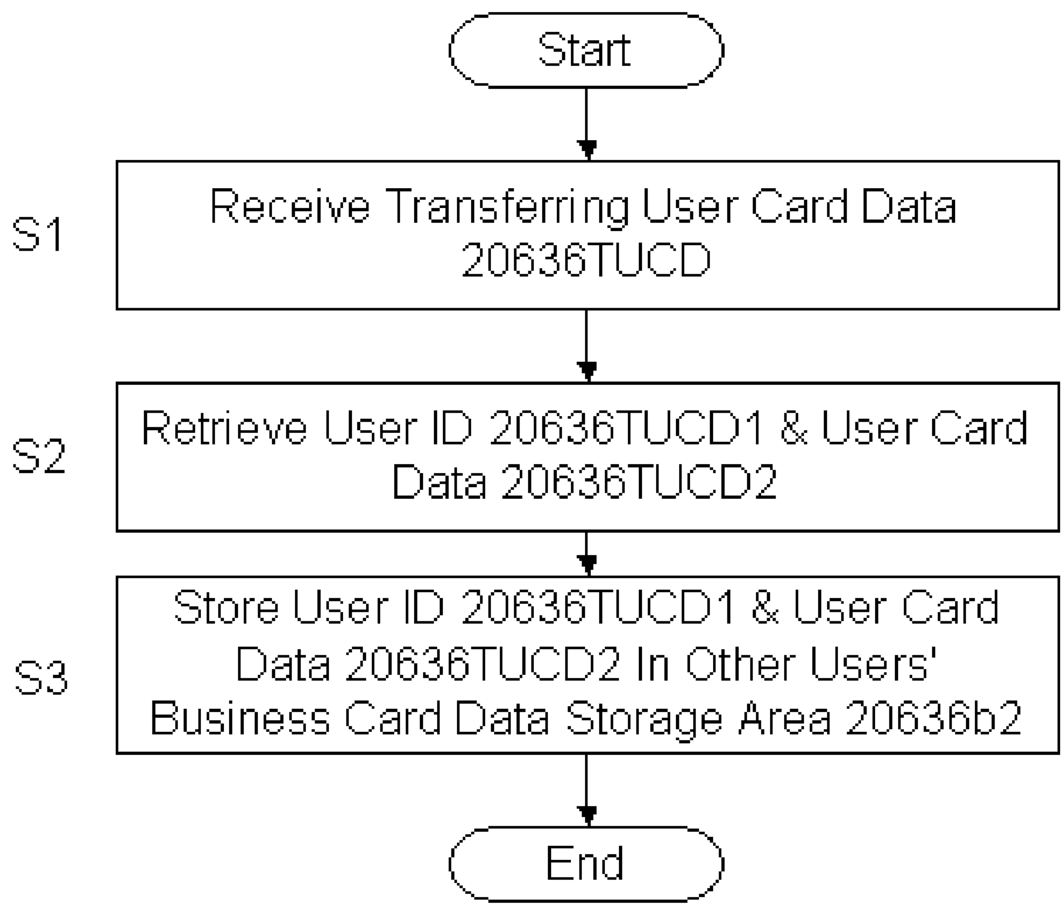

FIG. 783 is a flowchart illustrating an exemplary embodiment of the present invention.

Figure 784:
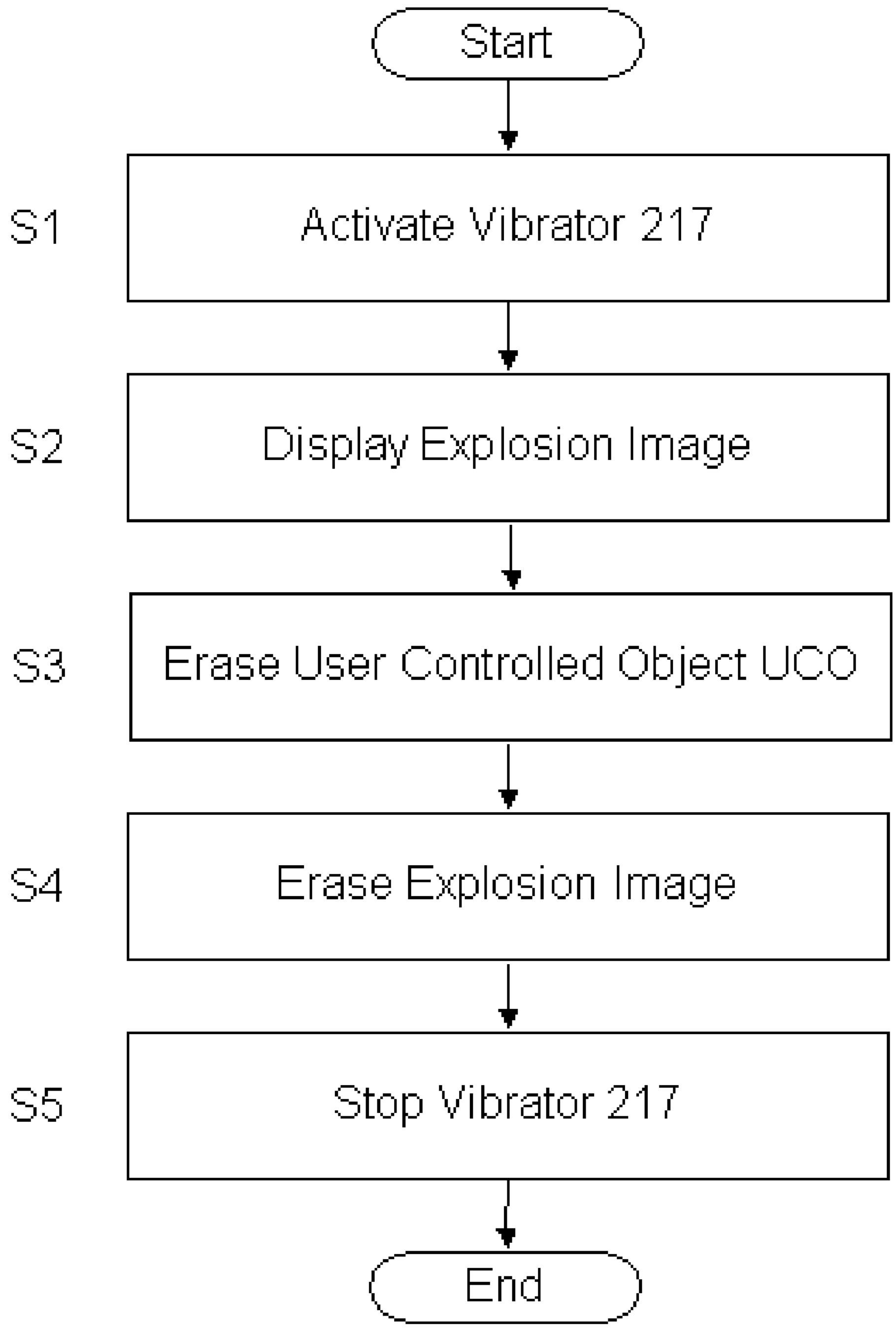

FIG. 784 is a flowchart illustrating an exemplary embodiment of the present invention.

Figure 785:
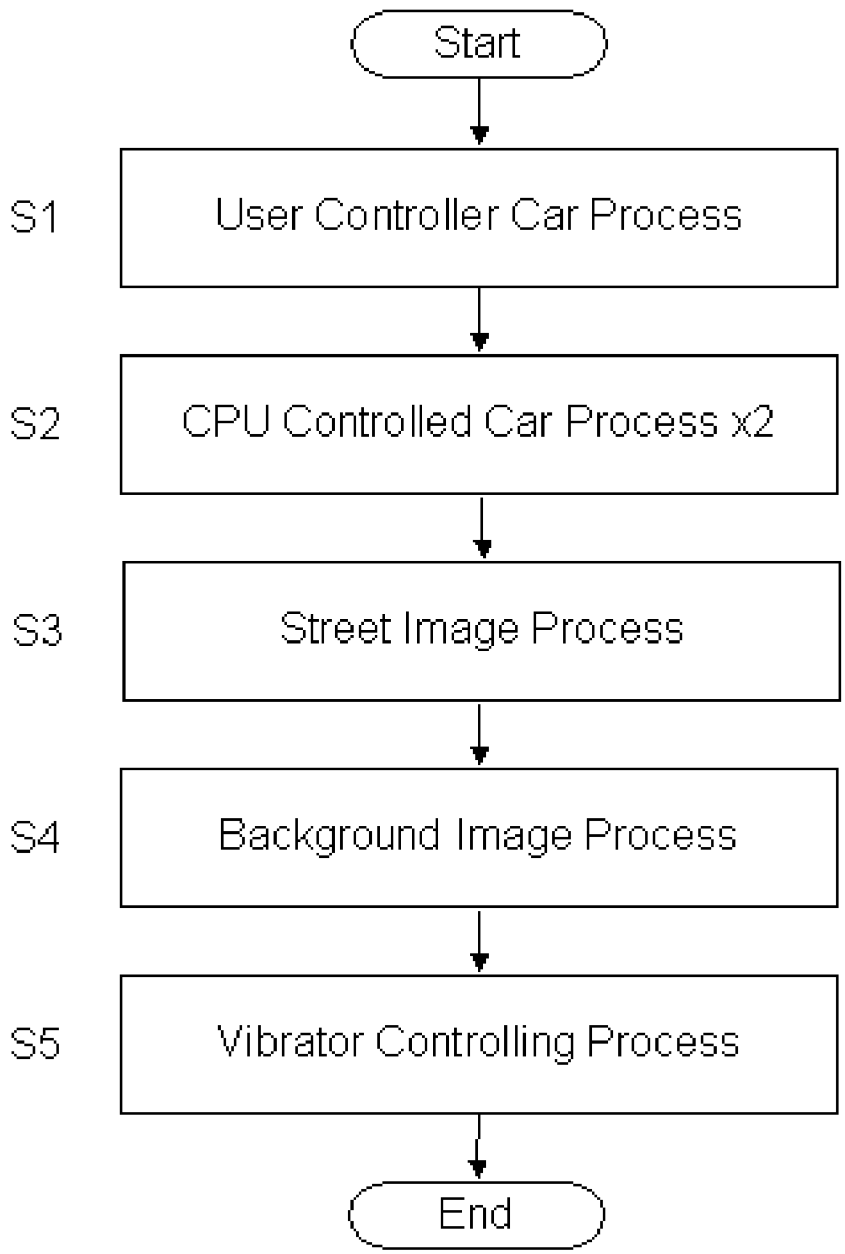

FIG. 785 is a flowchart illustrating an exemplary embodiment of the present invention.

Figure 786:
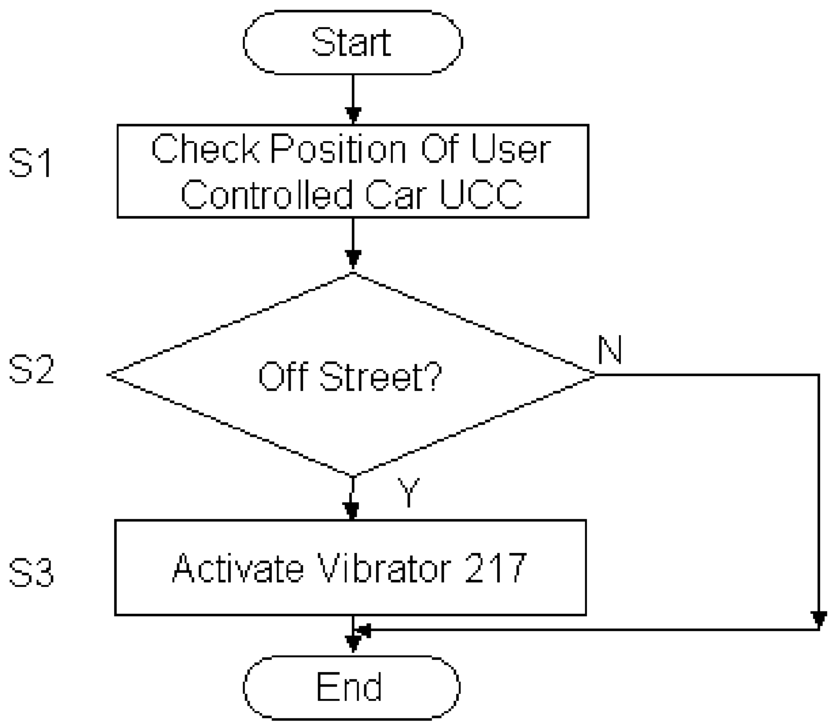

FIG. 786 is a flowchart illustrating an exemplary embodiment of the present invention.

Figure 787:
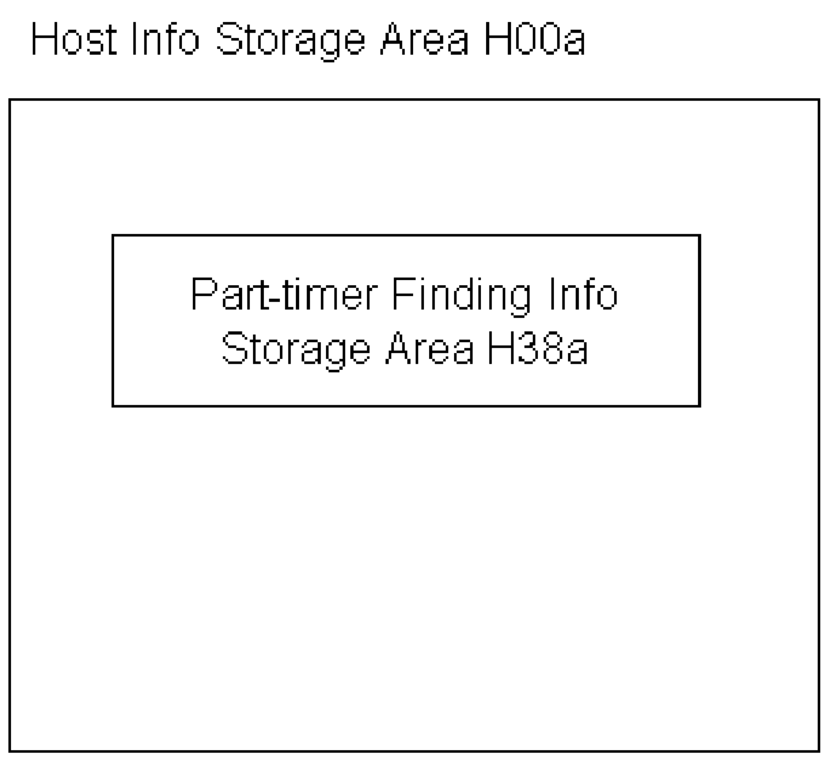

FIG. 787 is a block diagram illustrating an exemplary embodiment of the present invention.

Figure 788:
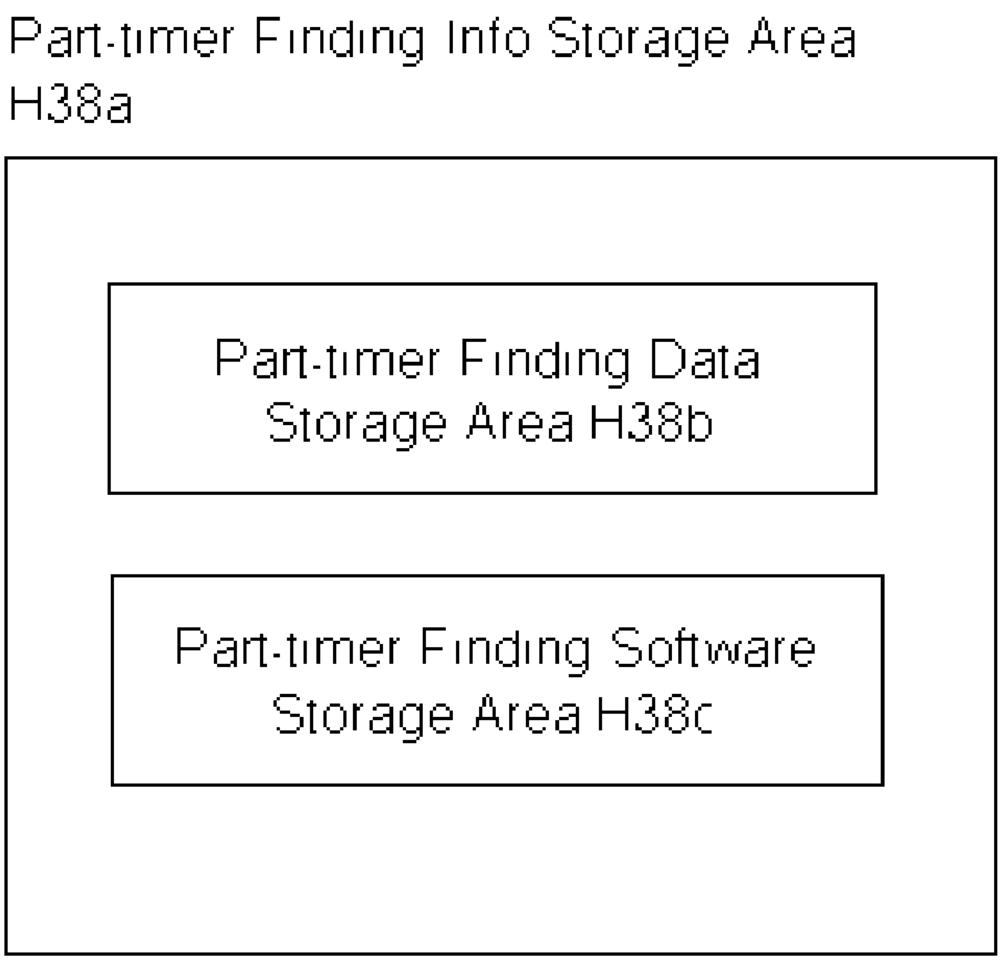

FIG. 788 is a block diagram illustrating an exemplary embodiment of the present invention.

Figure 789:

FIG. 789 is a block diagram illustrating an exemplary embodiment of the present invention.

FIG. 790 is a block diagram illustrating an exemplary embodiment of the present invention.

FIG. 791 is a block diagram illustrating an exemplary embodiment of the present invention.

Figure 792:
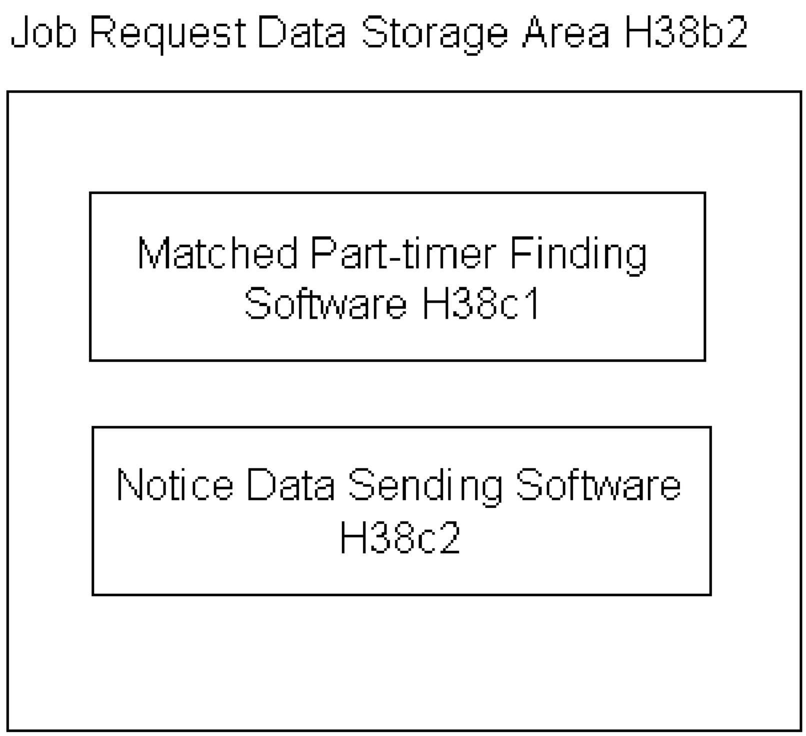

FIG. 792 is a block diagram illustrating an exemplary embodiment of the present invention.

Figure 793:
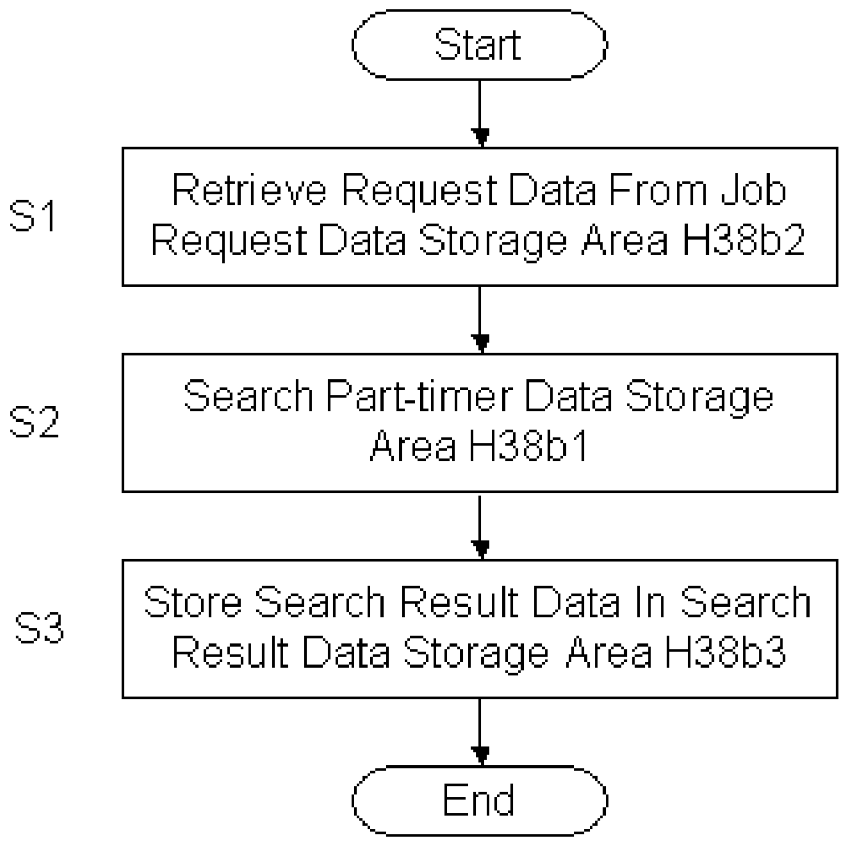

FIG. 793 is a flowchart illustrating an exemplary embodiment of the present invention.

Figure 794:
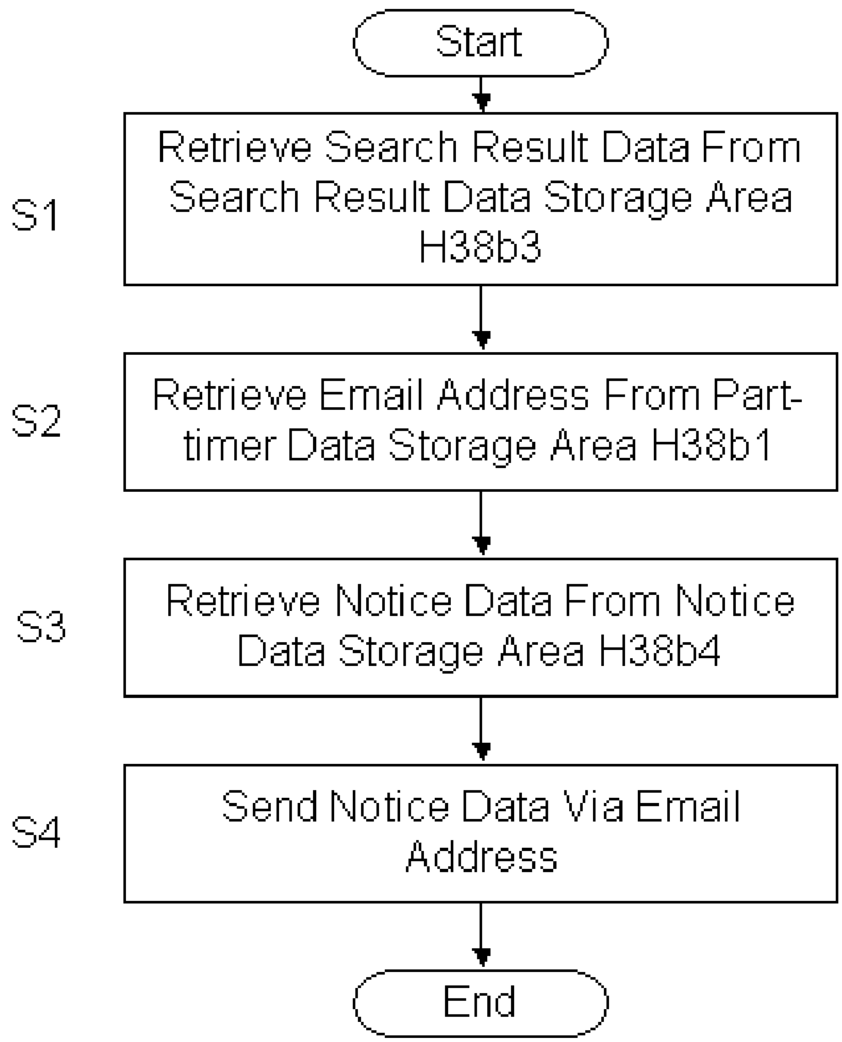

FIG. 794 is a flowchart illustrating an exemplary embodiment of the present invention.

Figure 795:
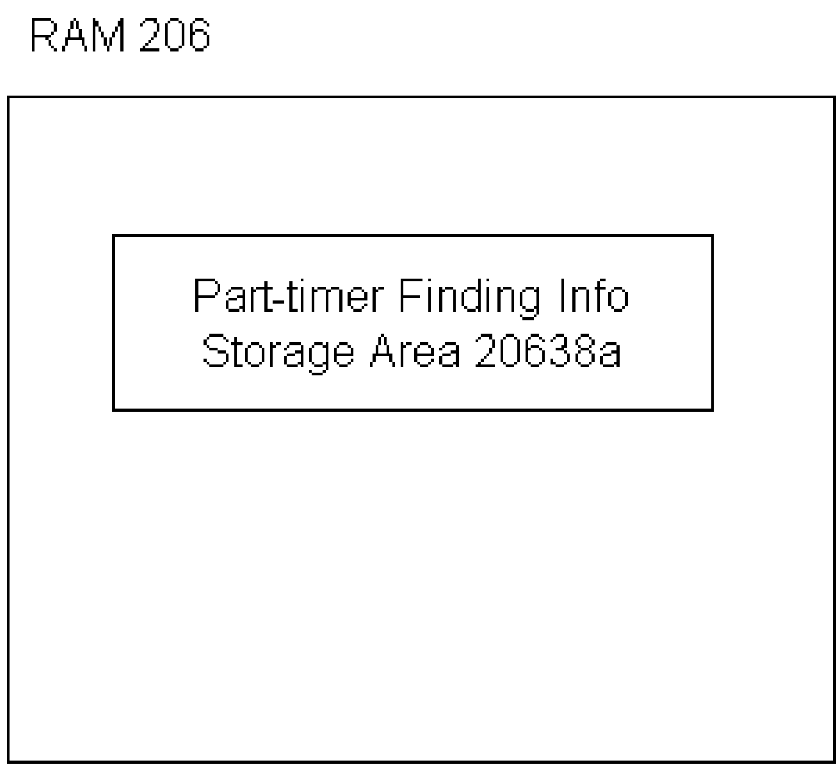

FIG. 795 is a block diagram illustrating an exemplary embodiment of the present invention.

Figure 796:
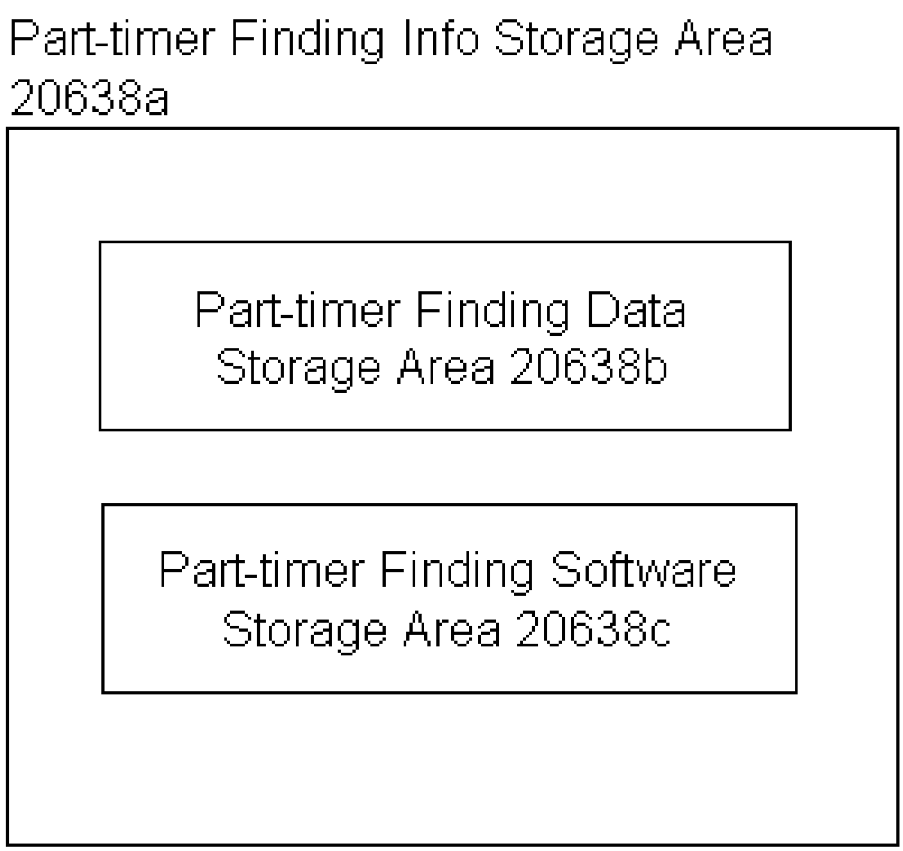

FIG. 796 is a block diagram illustrating an exemplary embodiment of the present invention.

Figure 797:
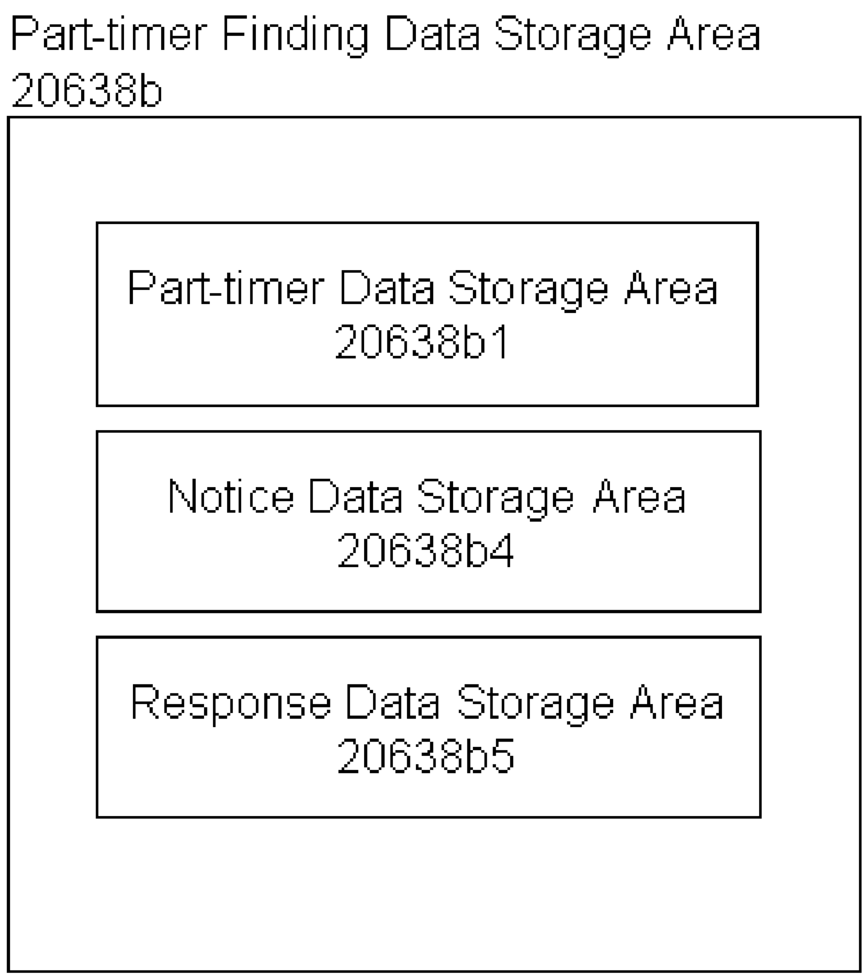

FIG. 797 is a block diagram illustrating an exemplary embodiment of the present invention.

FIG. 798 is a block diagram illustrating an exemplary embodiment of the present invention.

Figure 799:
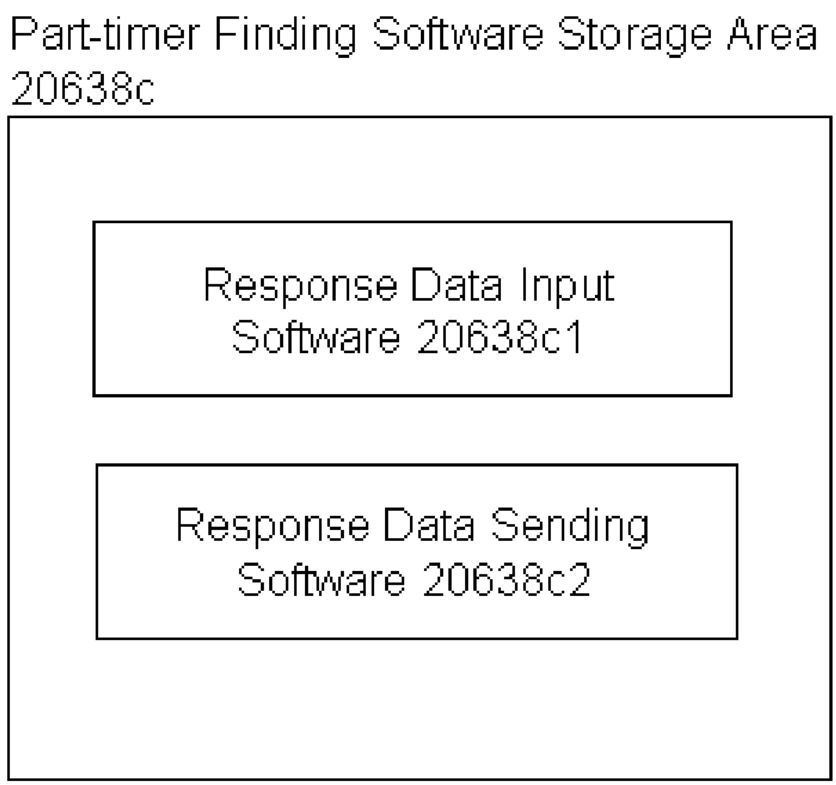

FIG. 799 is a block diagram illustrating an exemplary embodiment of the present invention.

Figure 800:
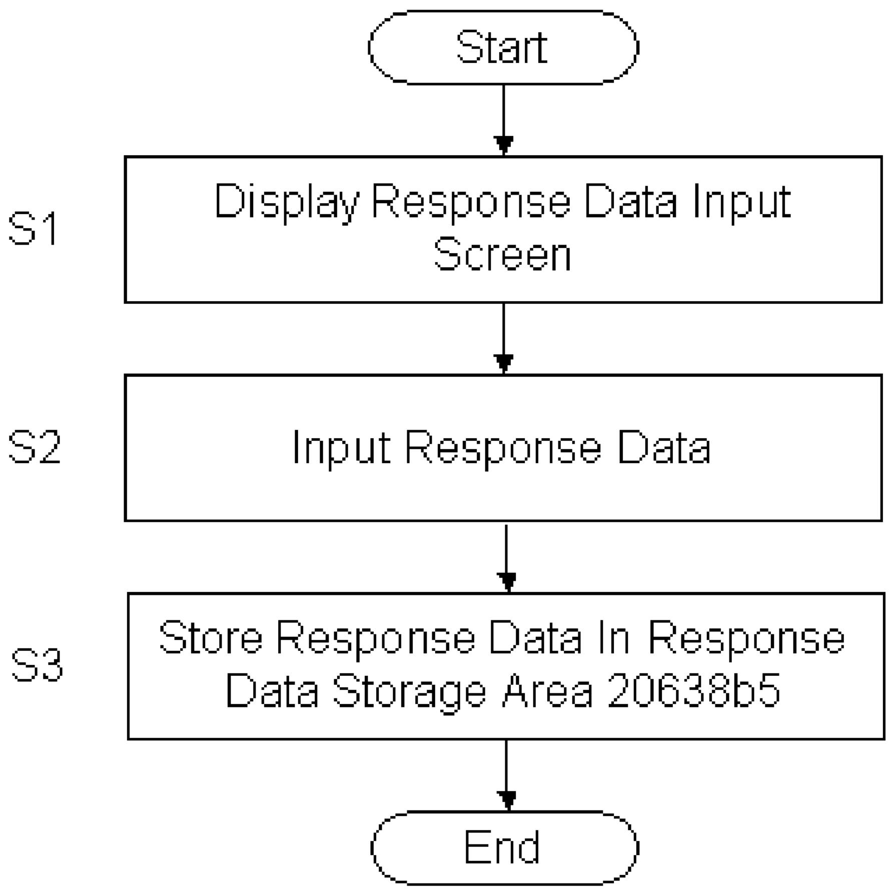

FIG. 800 is a flowchart illustrating an exemplary embodiment of the present invention.

Figure 801:
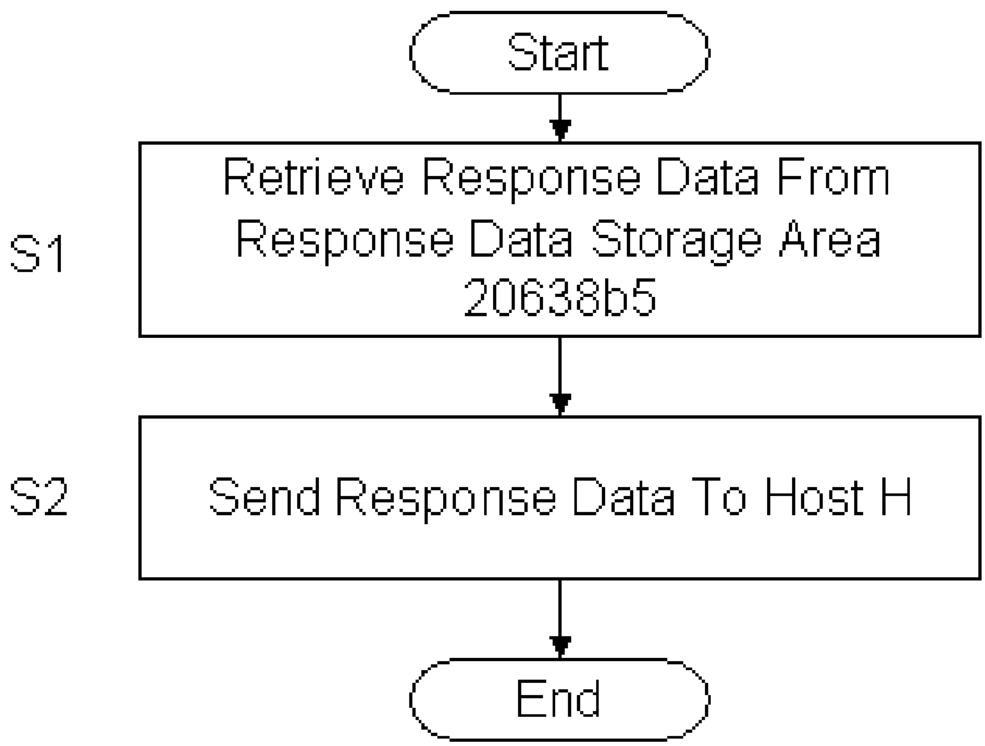

FIG. 801 is a flowchart illustrating an exemplary embodiment of the present invention.

Figure 802:
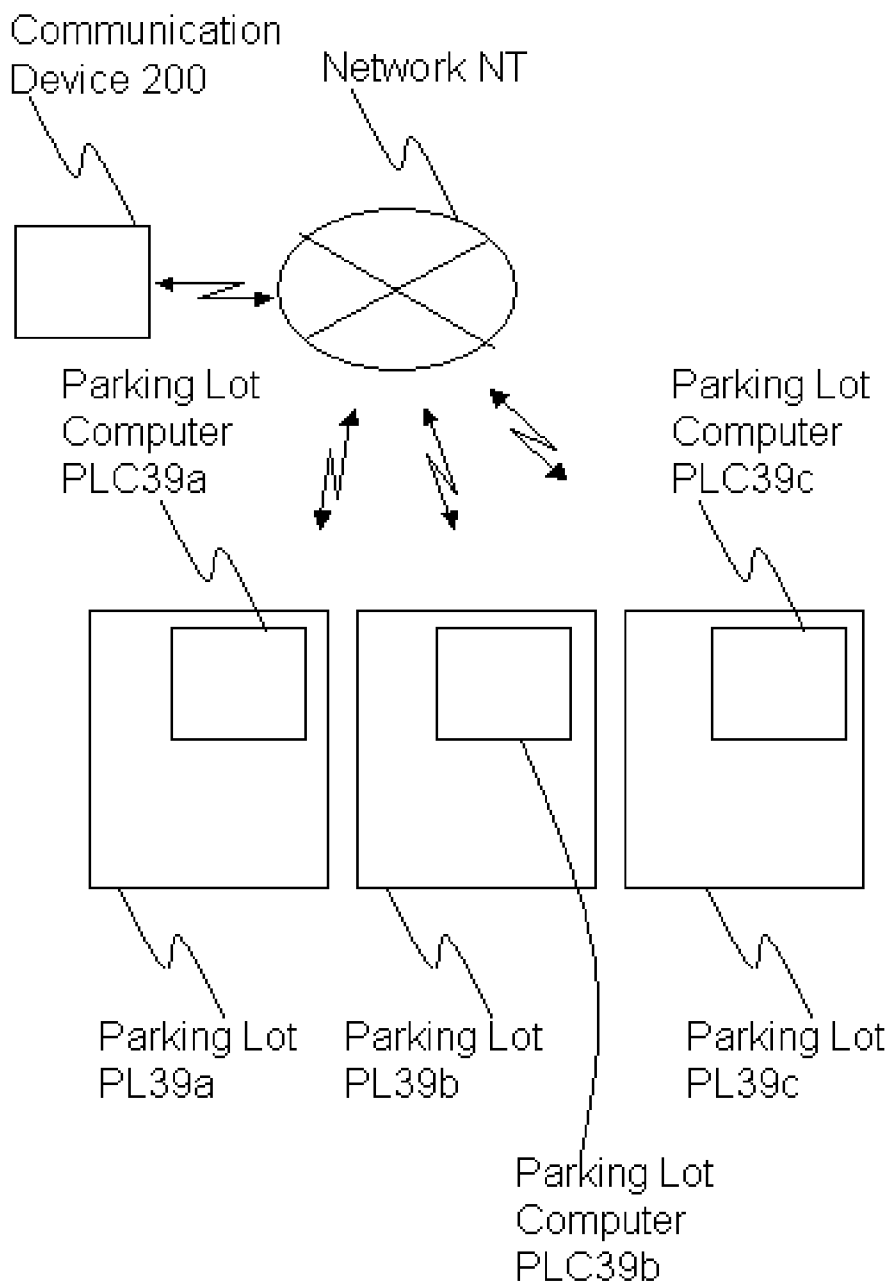

FIG. 802 is a simplified illustration illustrating an exemplary embodiment of the present invention.

Figure 803:
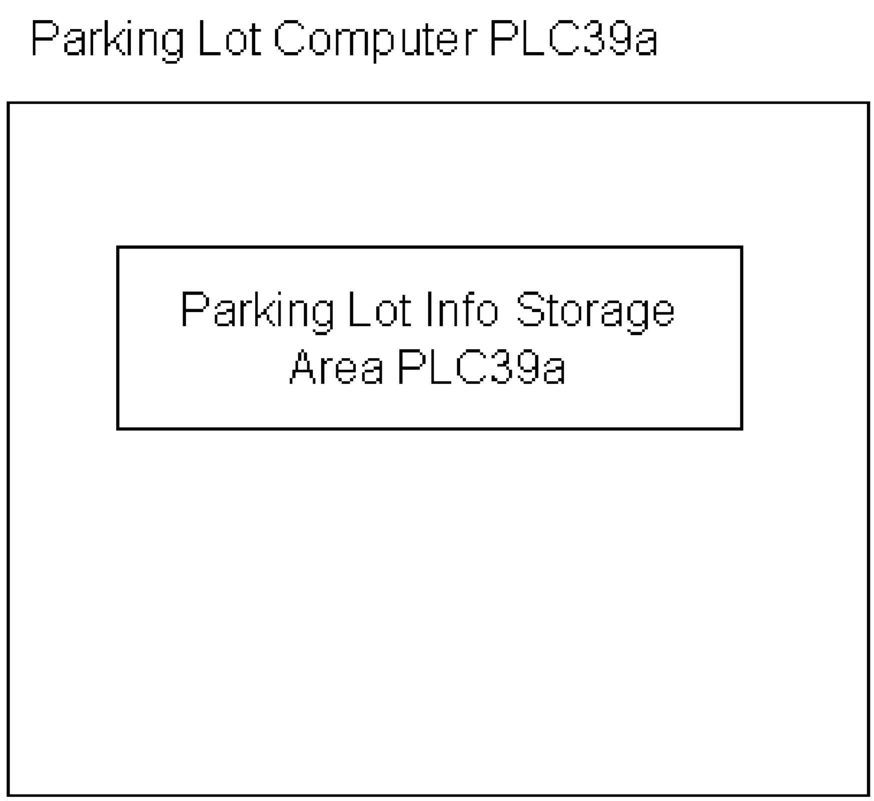

FIG. 803 is a block diagram illustrating an exemplary embodiment of the present invention.

Figure 804:
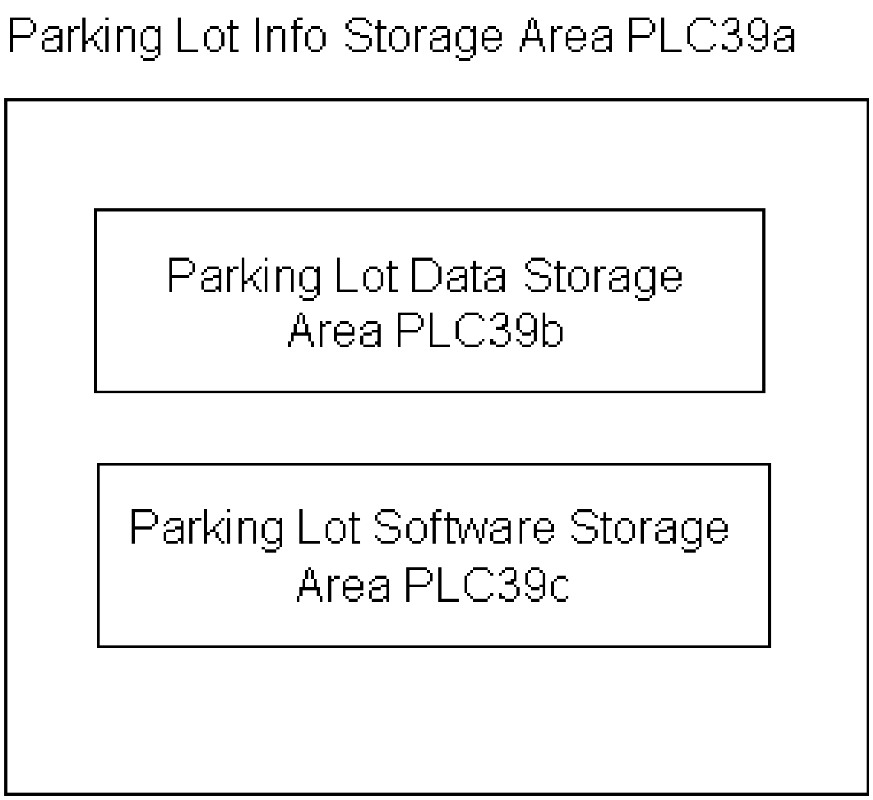

FIG. 804 is a block diagram illustrating an exemplary embodiment of the present invention.

FIG. 805 is a block diagram illustrating an exemplary embodiment of the present invention.

Figure 806:
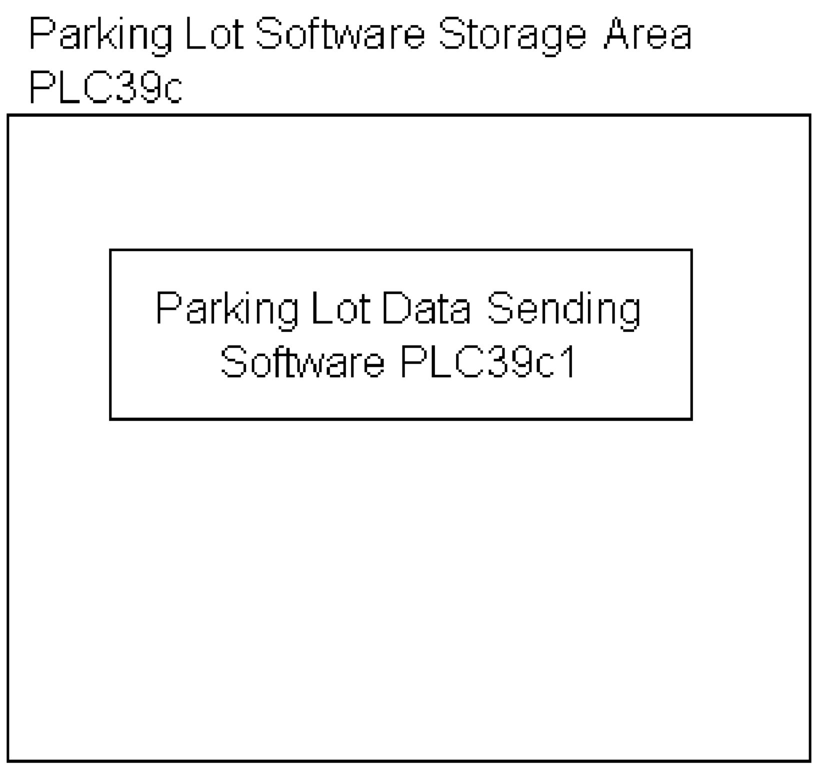

FIG. 806 is a block diagram illustrating an exemplary embodiment of the present invention.

Figure 807:
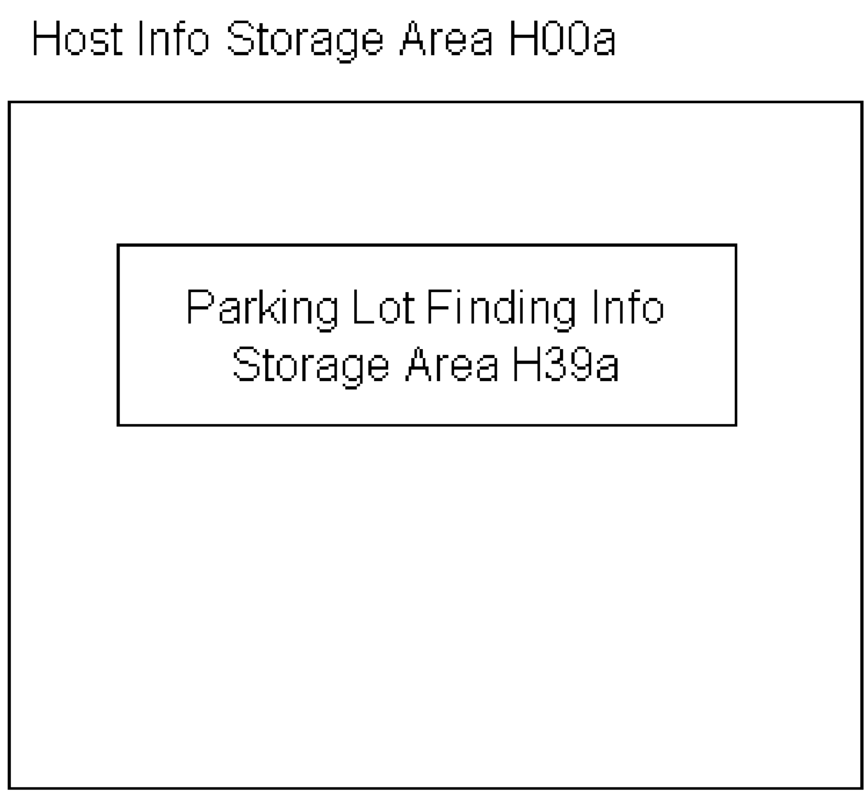

FIG. 807 is a block diagram illustrating an exemplary embodiment of the present invention.

Figure 808:
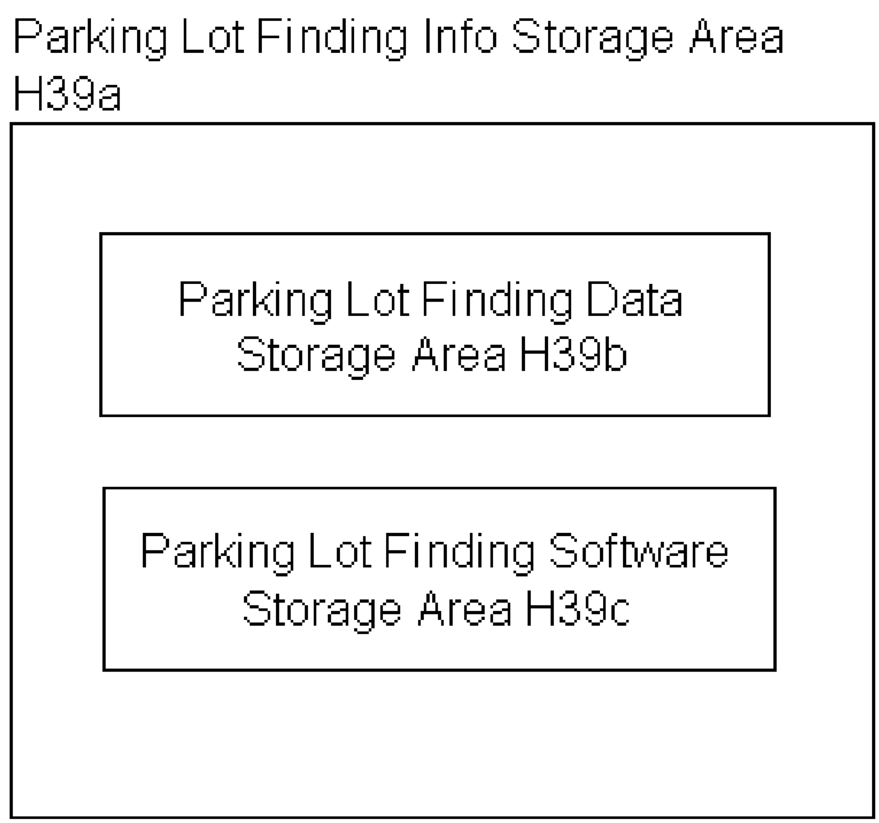

FIG. 808 is a block diagram illustrating an exemplary embodiment of the present invention.

Figure 809:
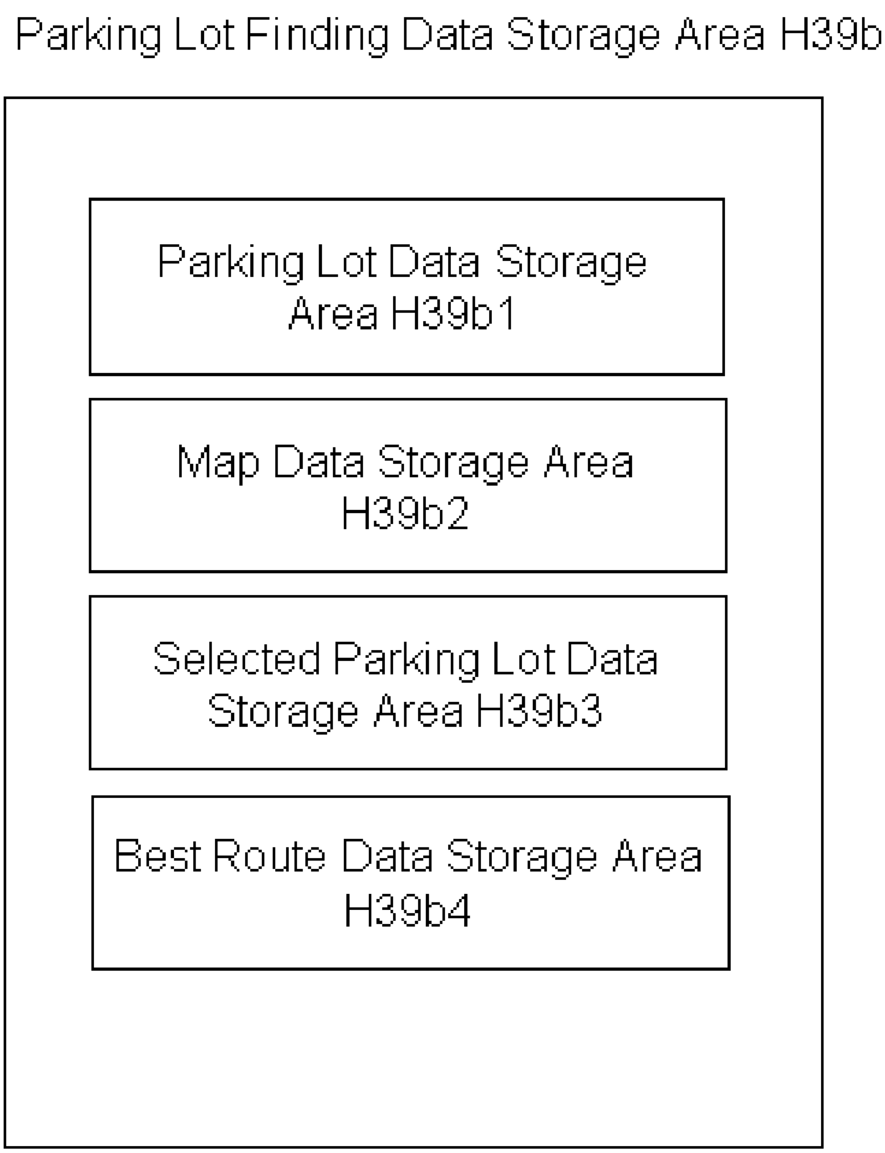

FIG. 809 is a block diagram illustrating an exemplary embodiment of the present invention.

Figure 810:
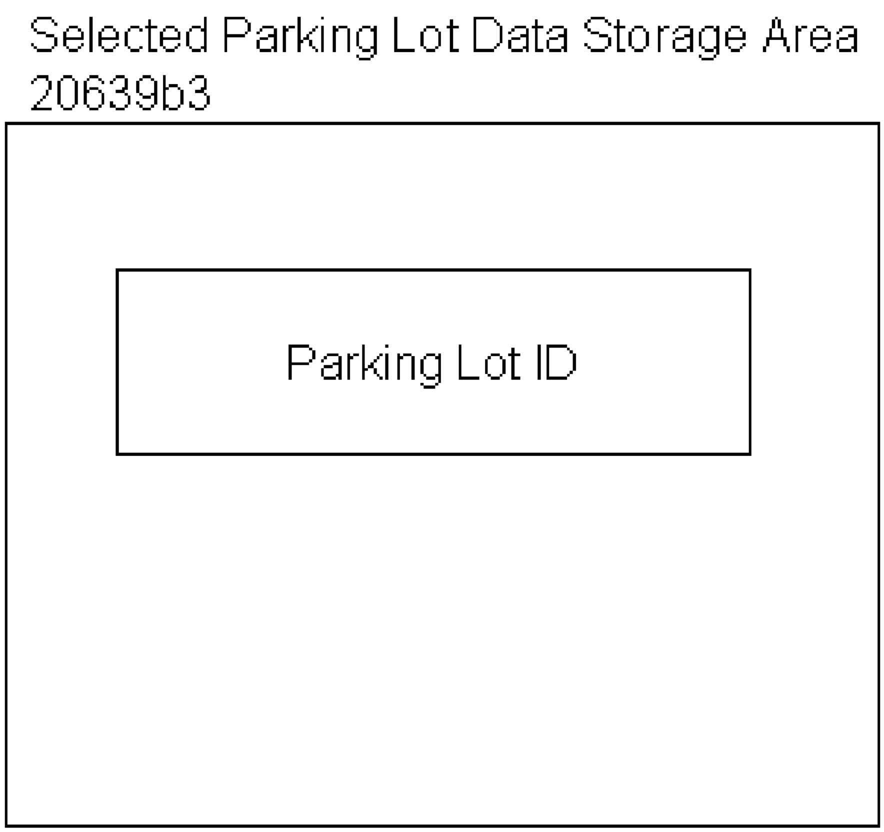

FIG. 810 is a block diagram illustrating an exemplary embodiment of the present invention.

FIG. 811 is a block diagram illustrating an exemplary embodiment of the present invention.

Figure 812:
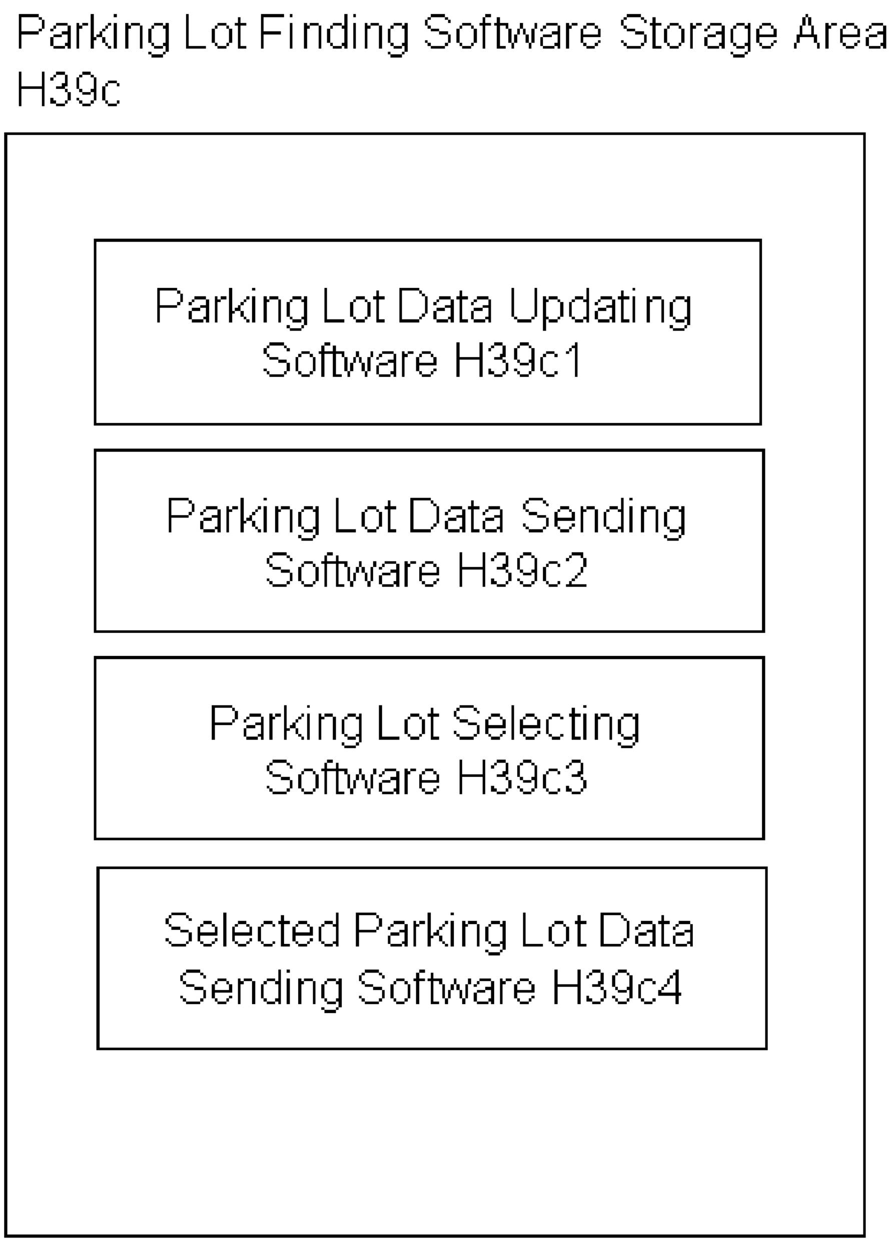

FIG. 812 is a block diagram illustrating an exemplary embodiment of the present invention.

Figure 813:
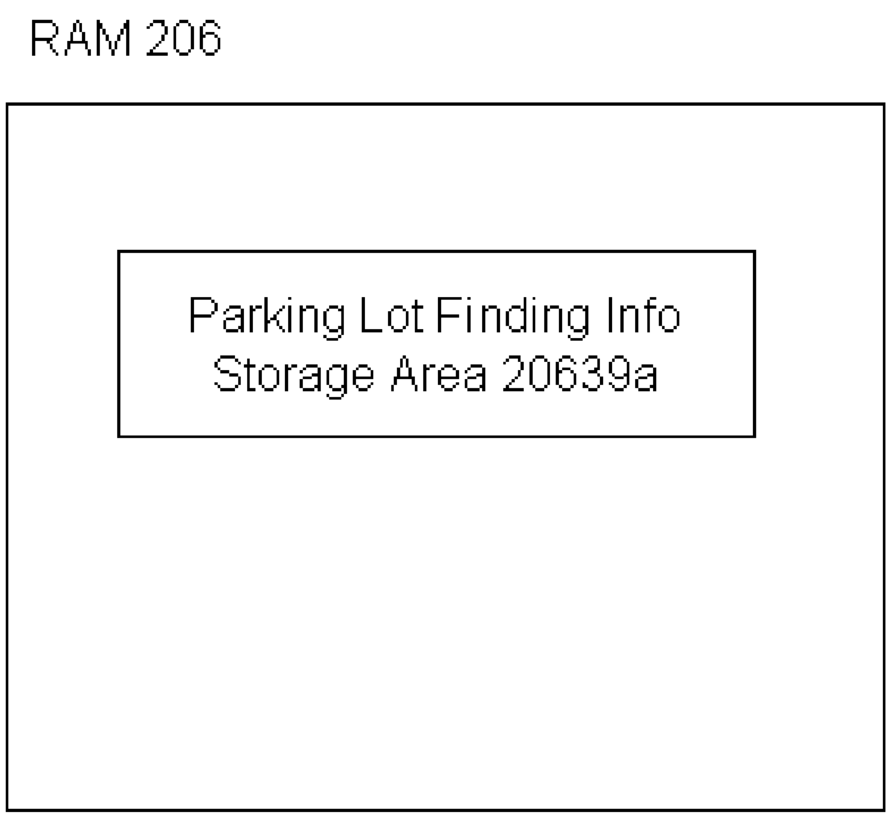

FIG. 813 is a block diagram illustrating an exemplary embodiment of the present invention.

Figure 814:
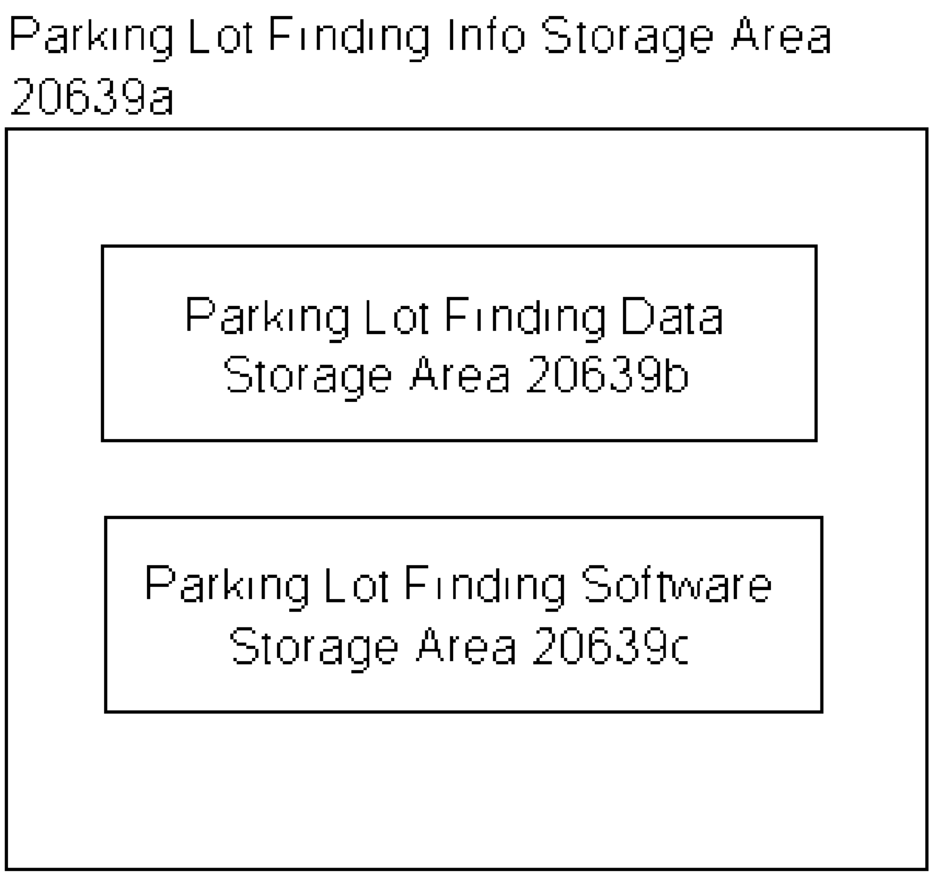

FIG. 814 is a block diagram illustrating an exemplary embodiment of the present invention.

Figure 815:
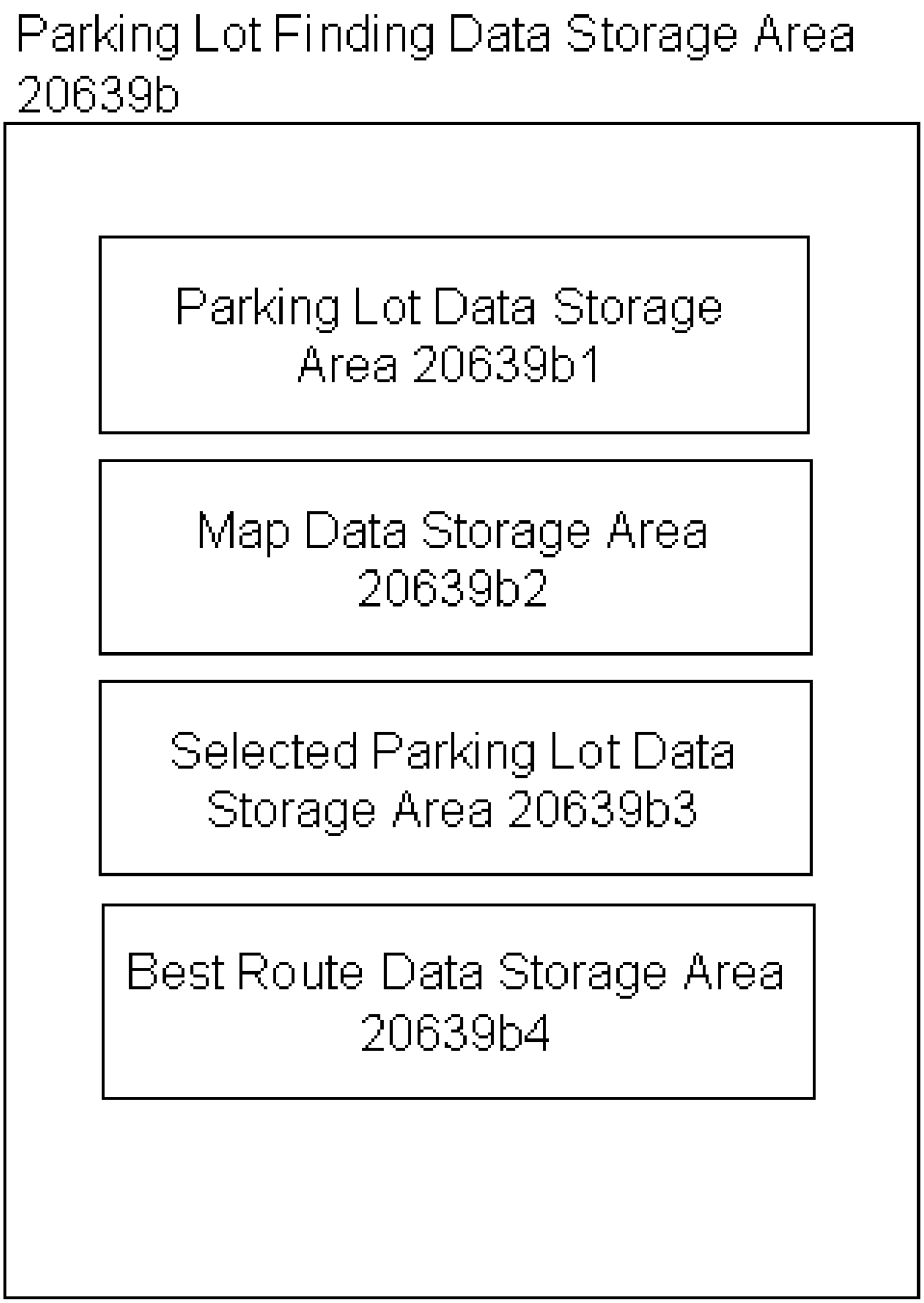

FIG. 815 is a block diagram illustrating an exemplary embodiment of the present invention.

FIG. 816 is a block diagram illustrating an exemplary embodiment of the present invention.

Figure 817:
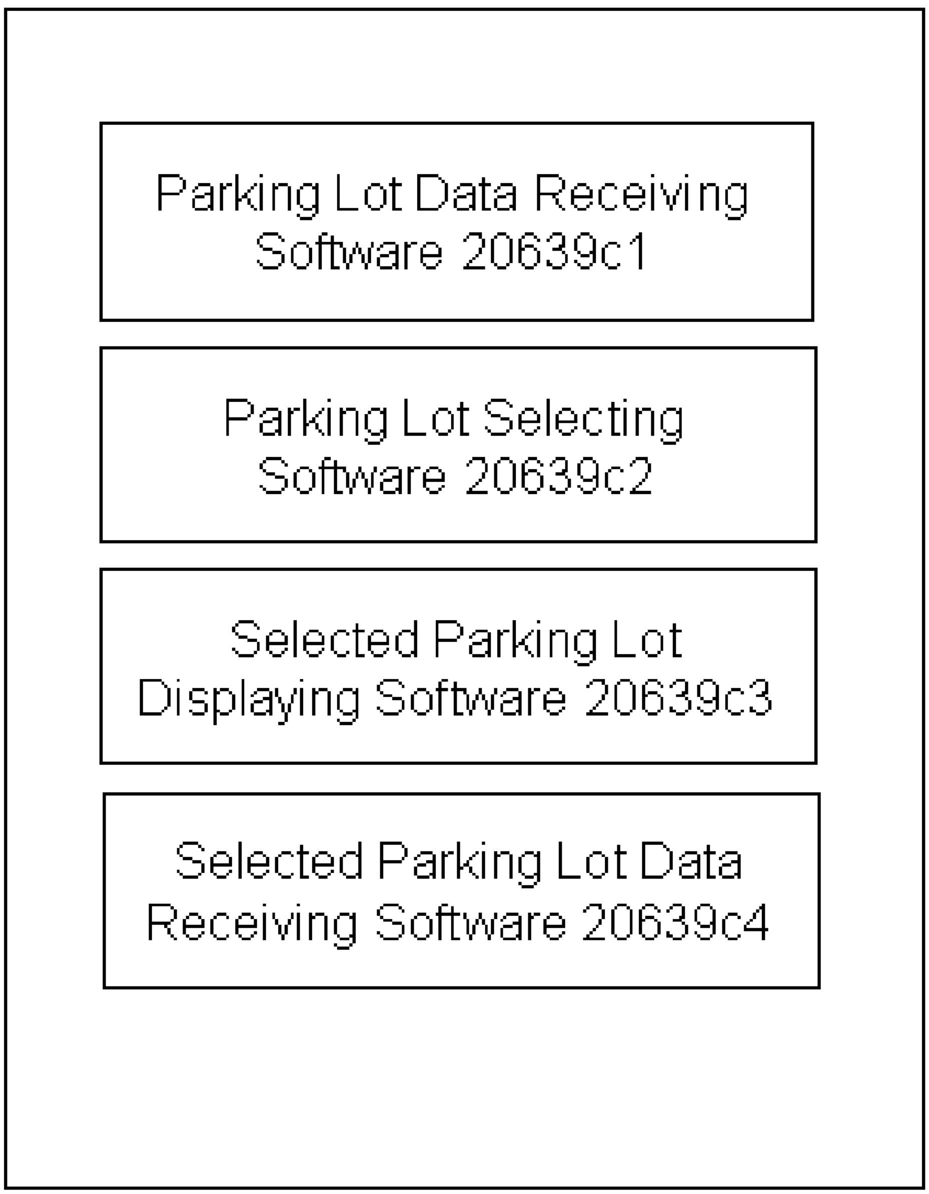

FIG. 817 is a block diagram illustrating an exemplary embodiment of the present invention.

Figure 818:
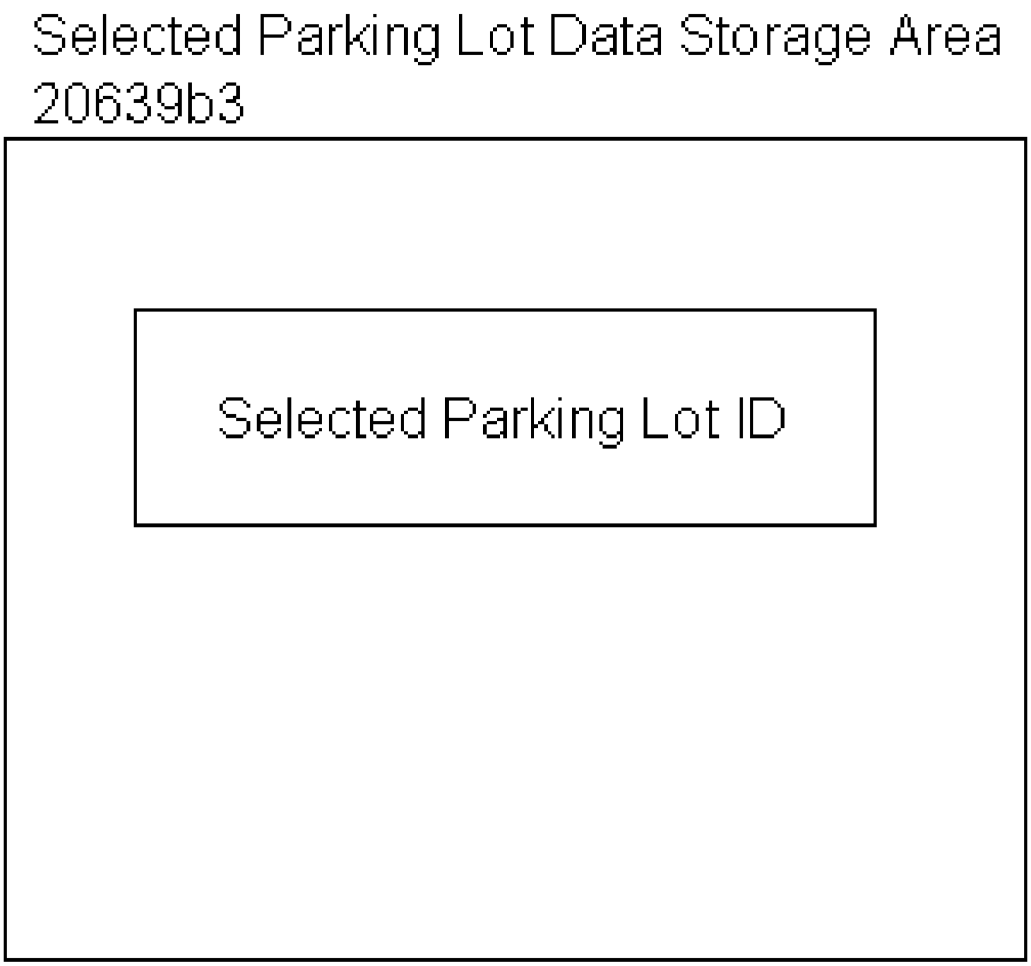

FIG. 818 is a block diagram illustrating an exemplary embodiment of the present invention.

Figure 819:
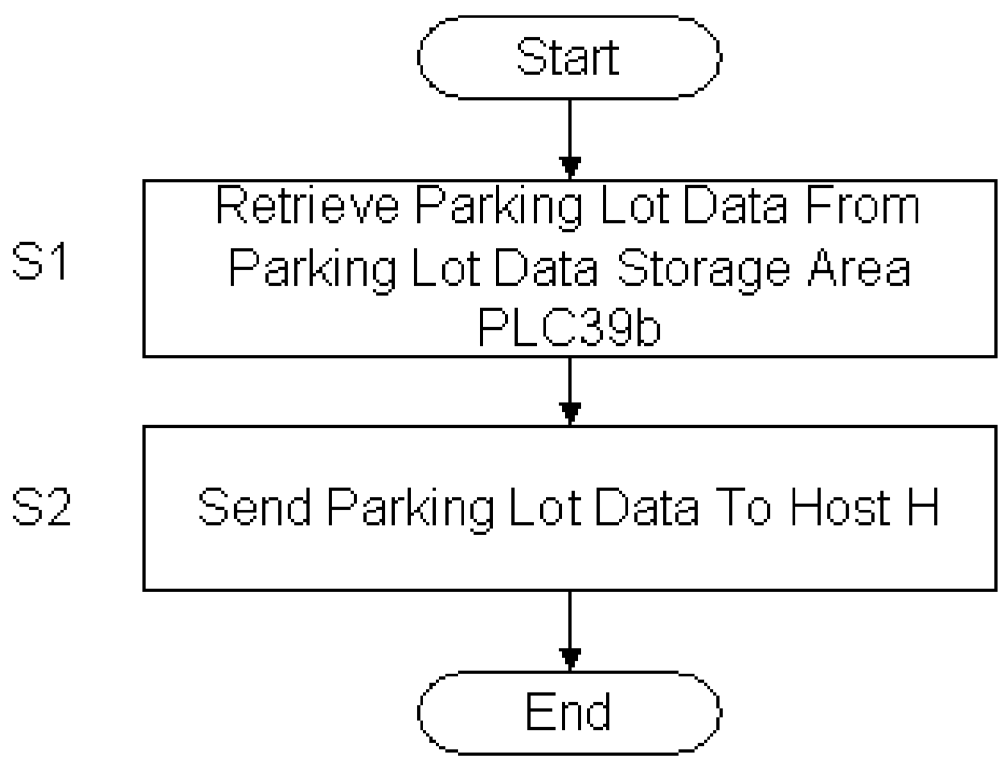

FIG. 819 is a flowchart illustrating an exemplary embodiment of the present invention.

Figure 820:
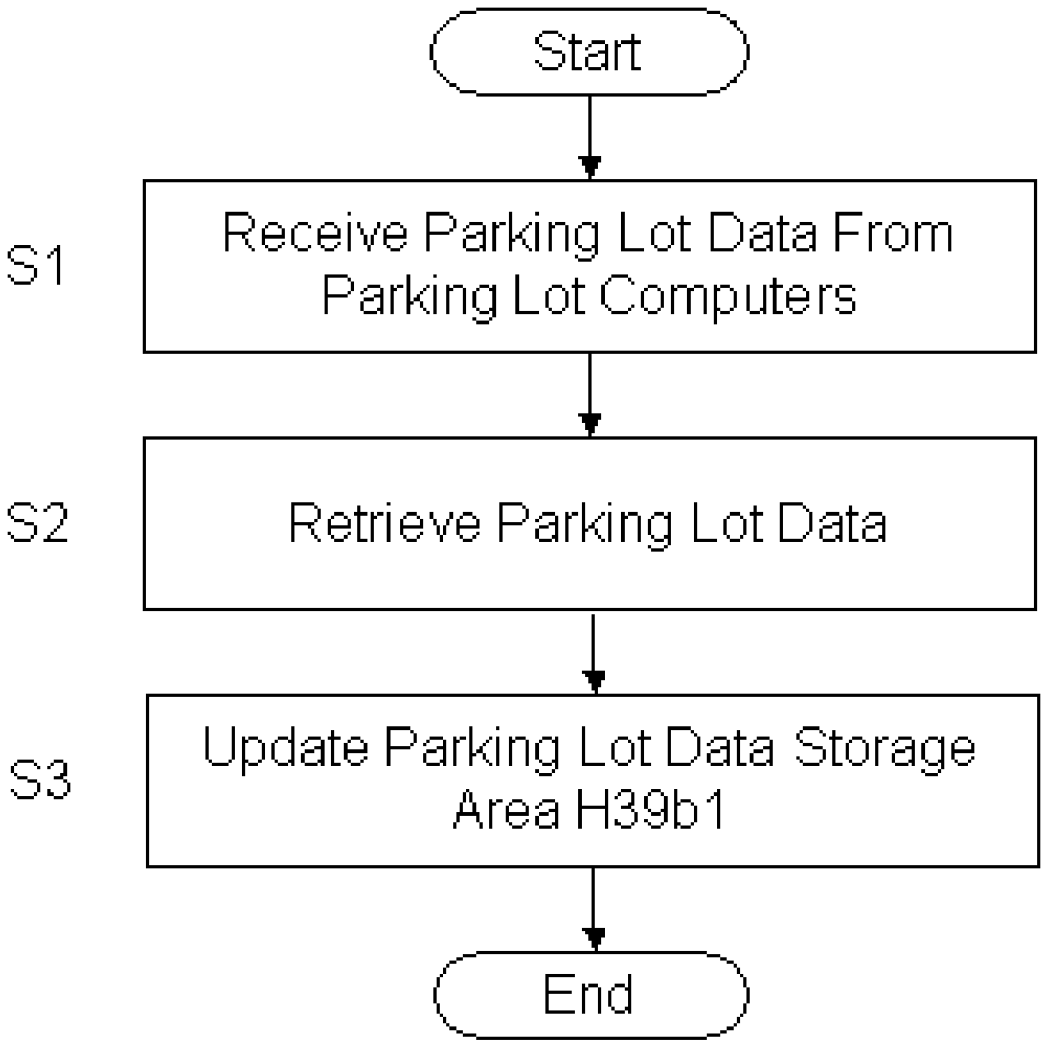

FIG. 820 is a flowchart illustrating an exemplary embodiment of the present invention.

Figure 821:
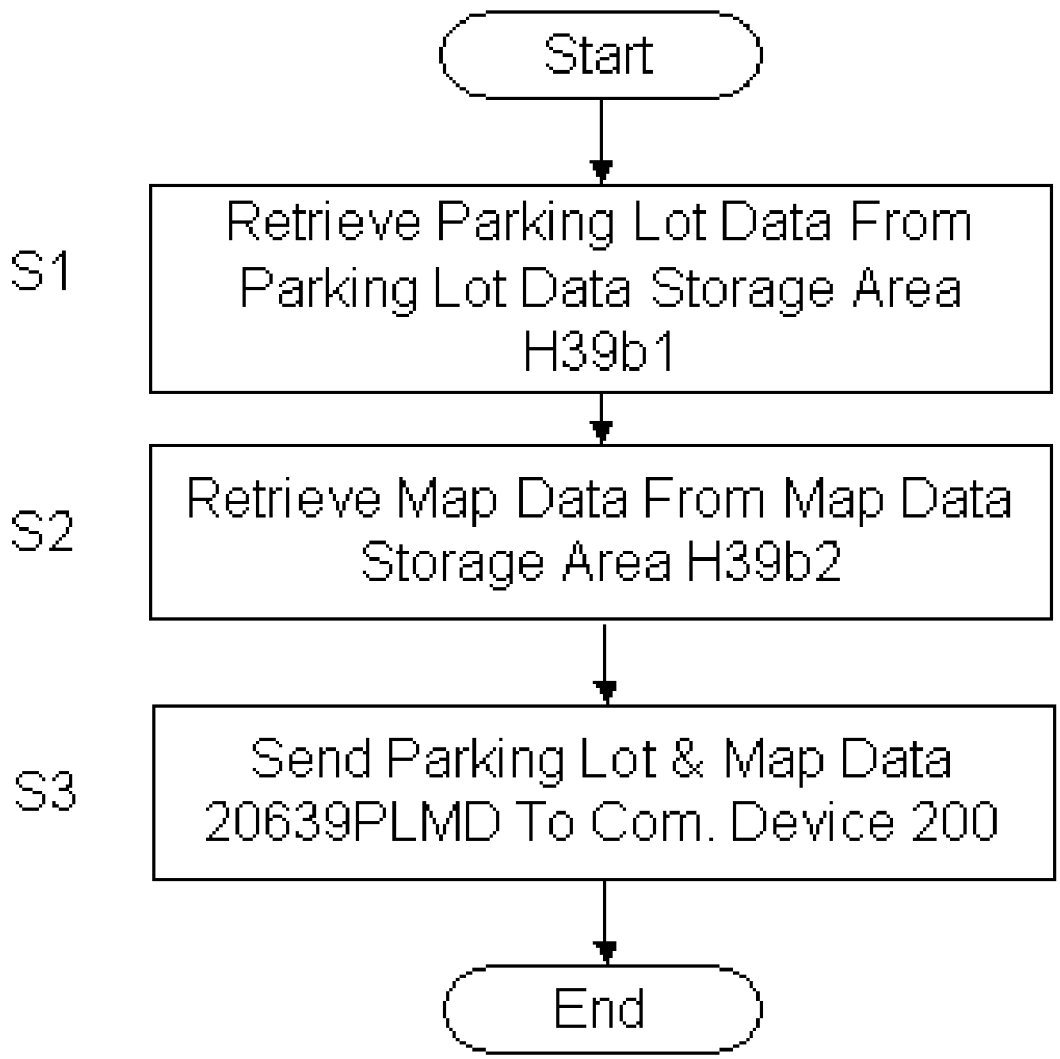

FIG. 821 is a flowchart illustrating an exemplary embodiment of the present invention.

Figure 822:
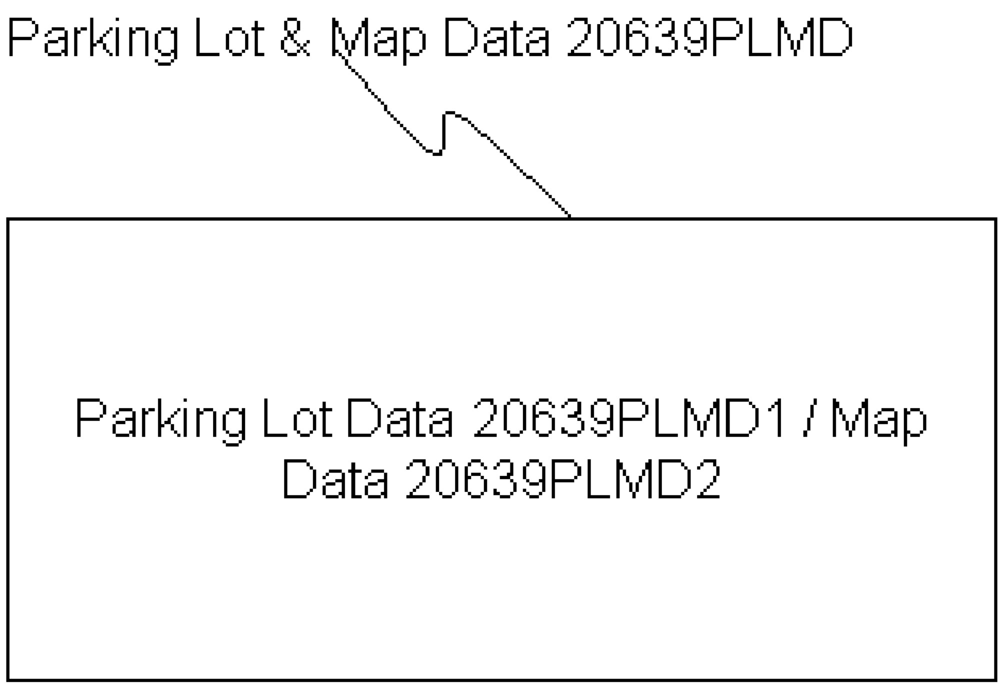

FIG. 822 is a simplified illustration of data utilized in the present invention.

Figure 823:
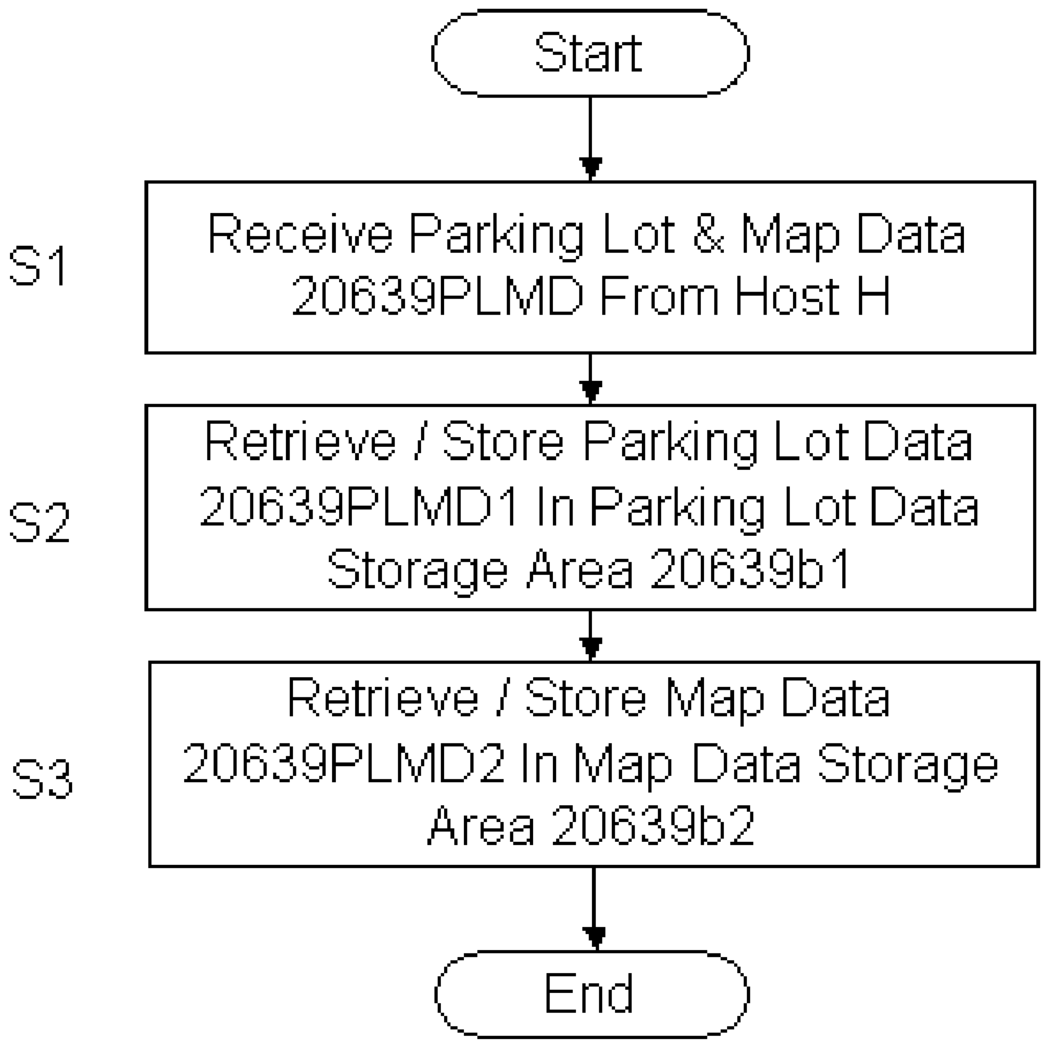

FIG. 823 is a flowchart illustrating an exemplary embodiment of the present invention.

Figure 824:
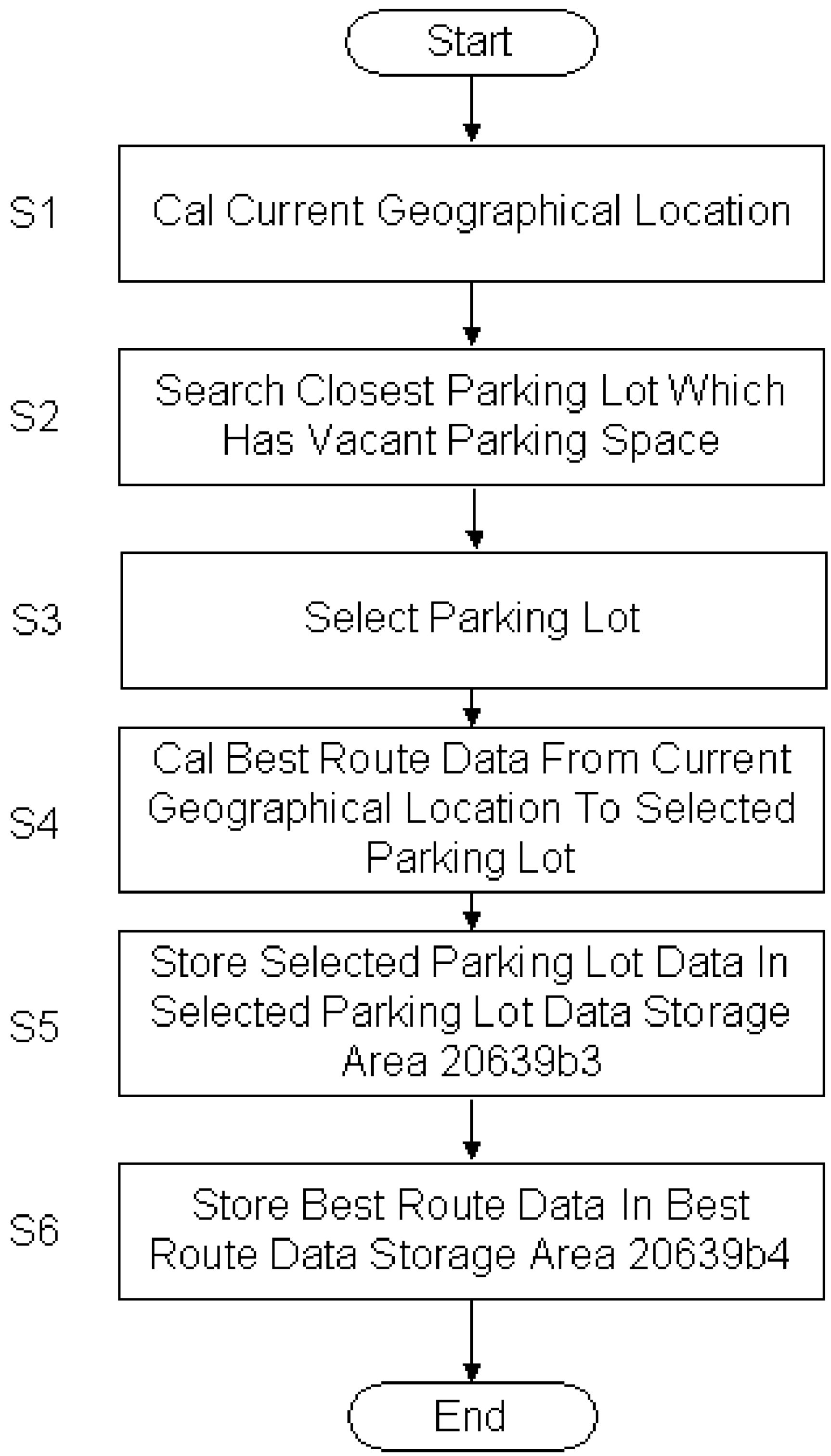

FIG. 824 is a flowchart illustrating an exemplary embodiment of the present invention.

Figure 825:
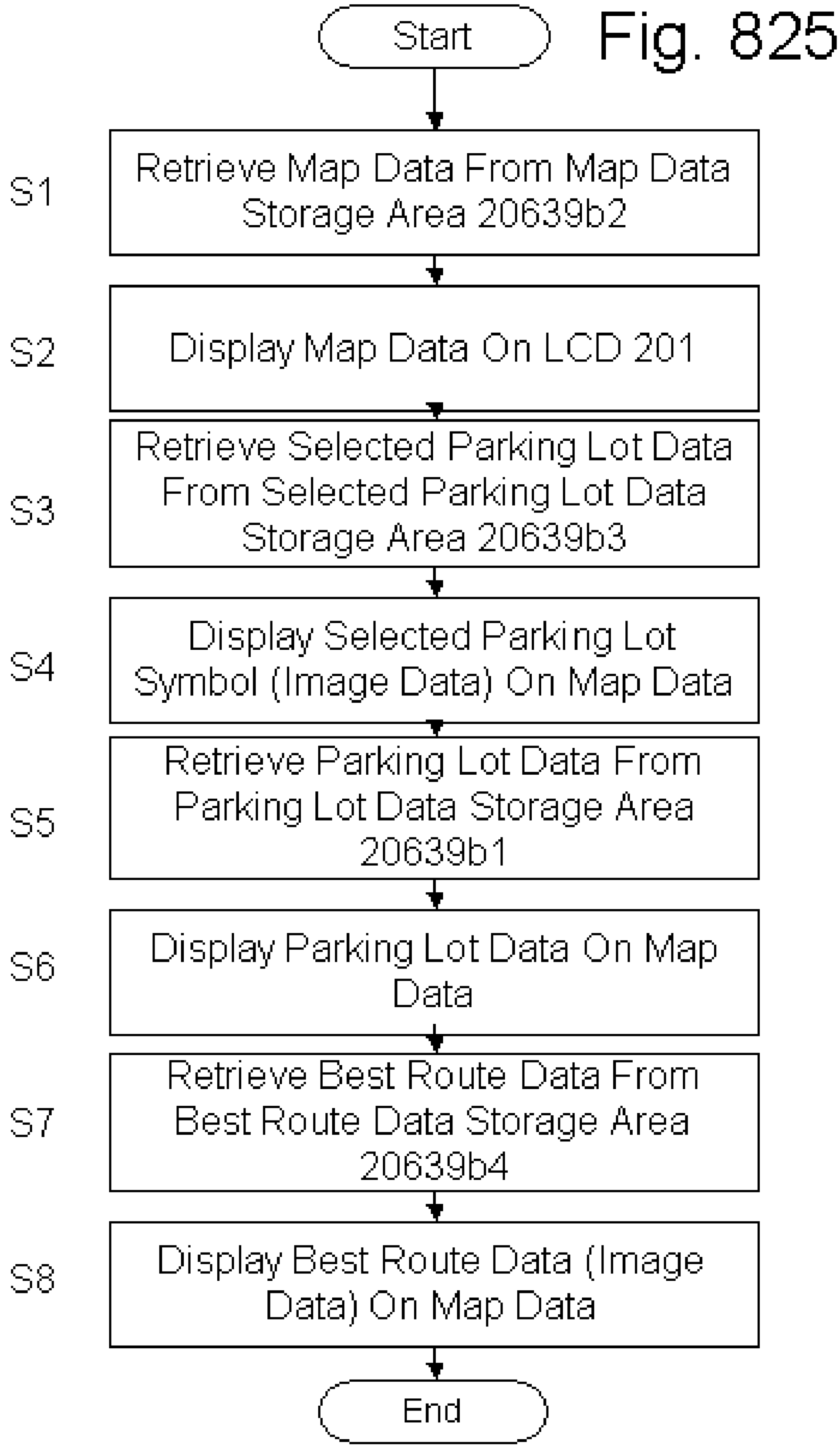

FIG. 825 is a flowchart illustrating an exemplary embodiment of the present invention.

Figure 826:
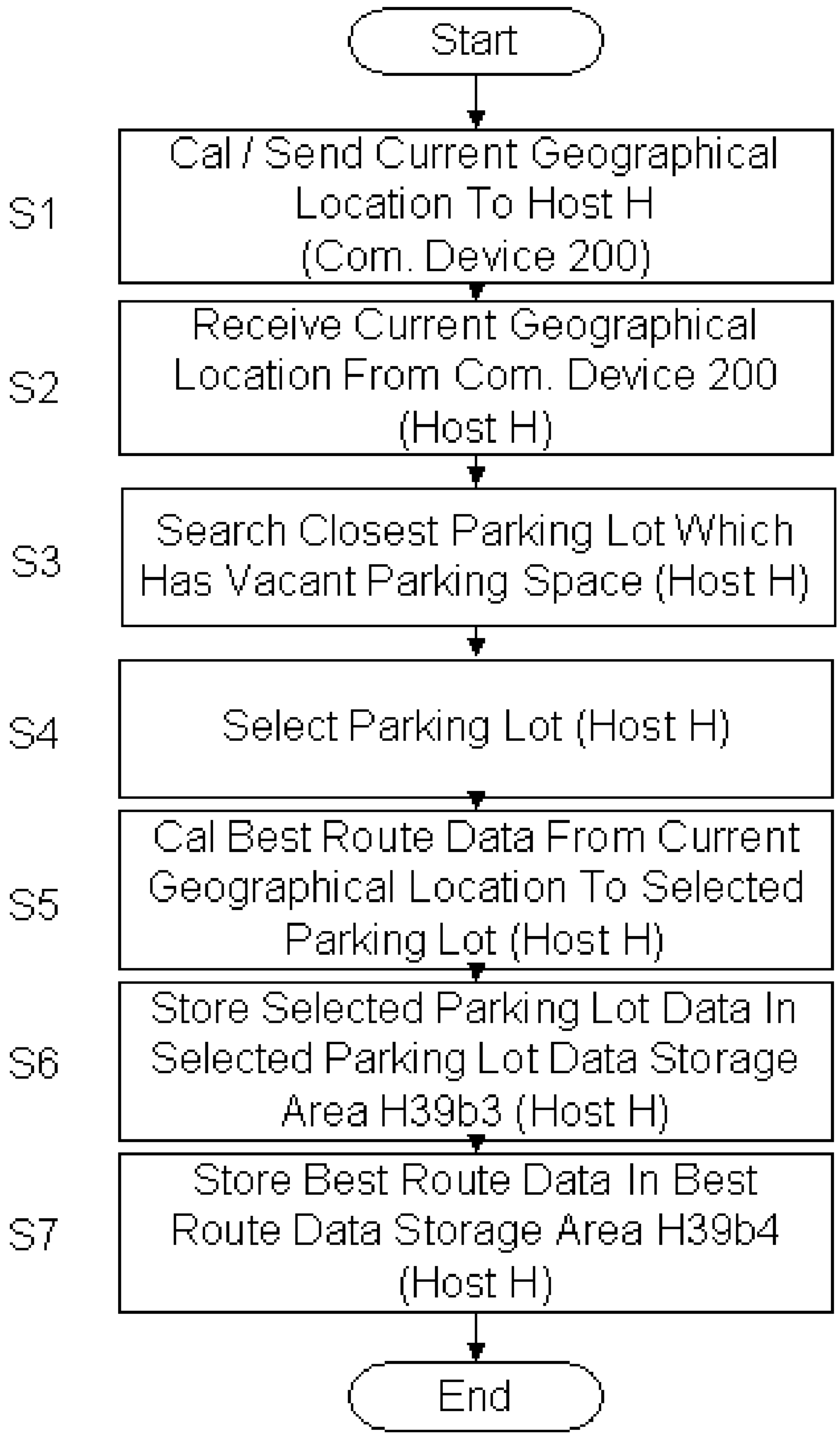

FIG. 826 is a flowchart illustrating an exemplary embodiment of the present invention.

Figure 827:
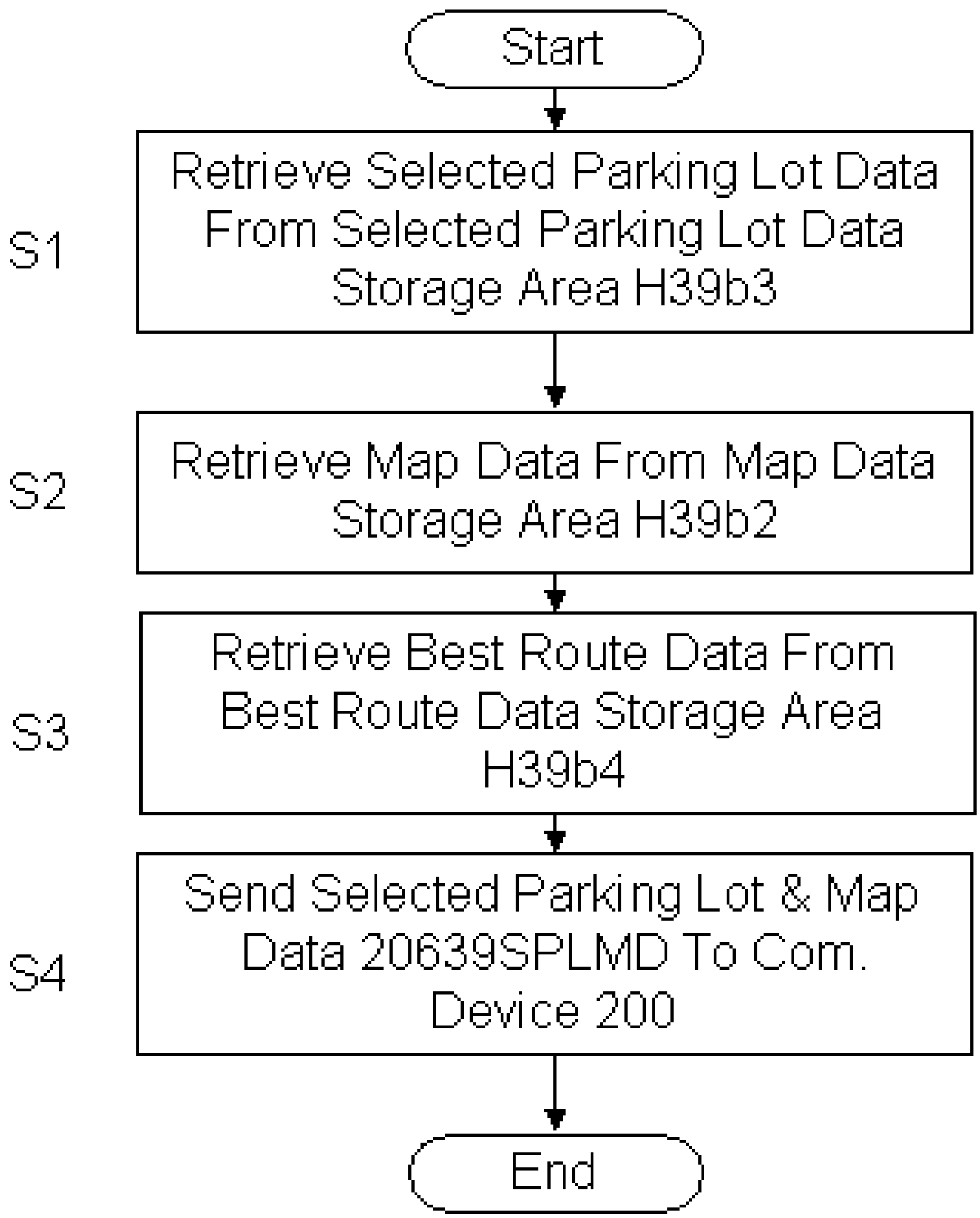

FIG. 827 is a flowchart illustrating an exemplary embodiment of the present invention.

Figure 828:
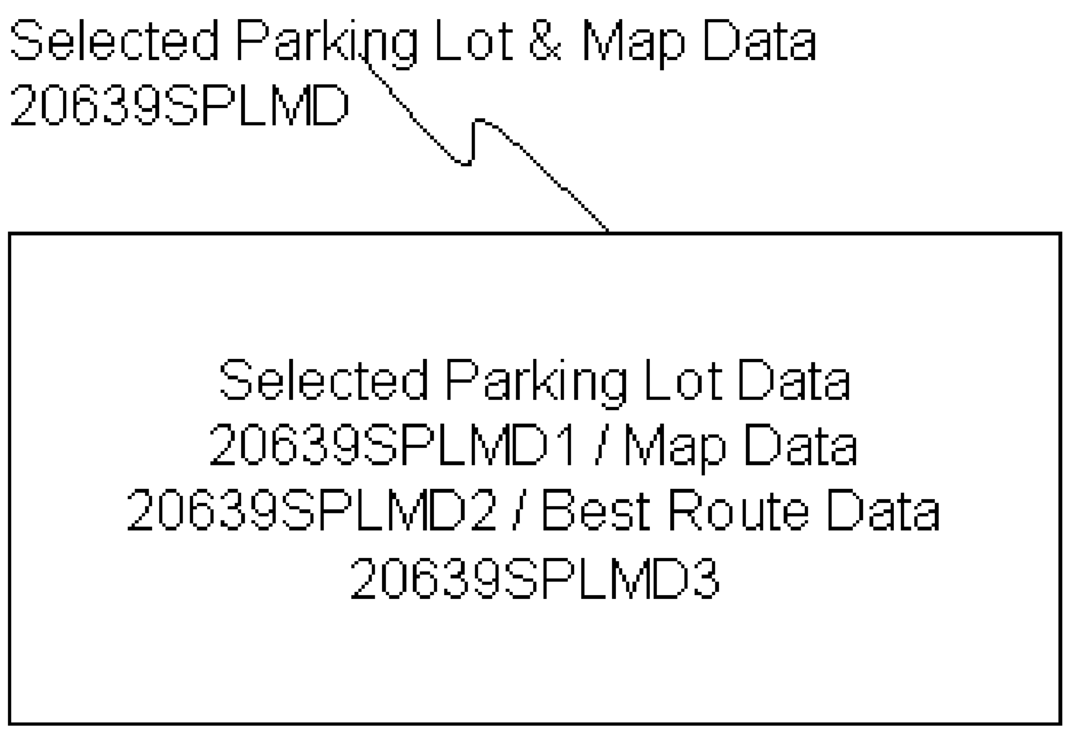

FIG. 828 is a simplified illustration of data utilized in the present invention.

Figure 829:
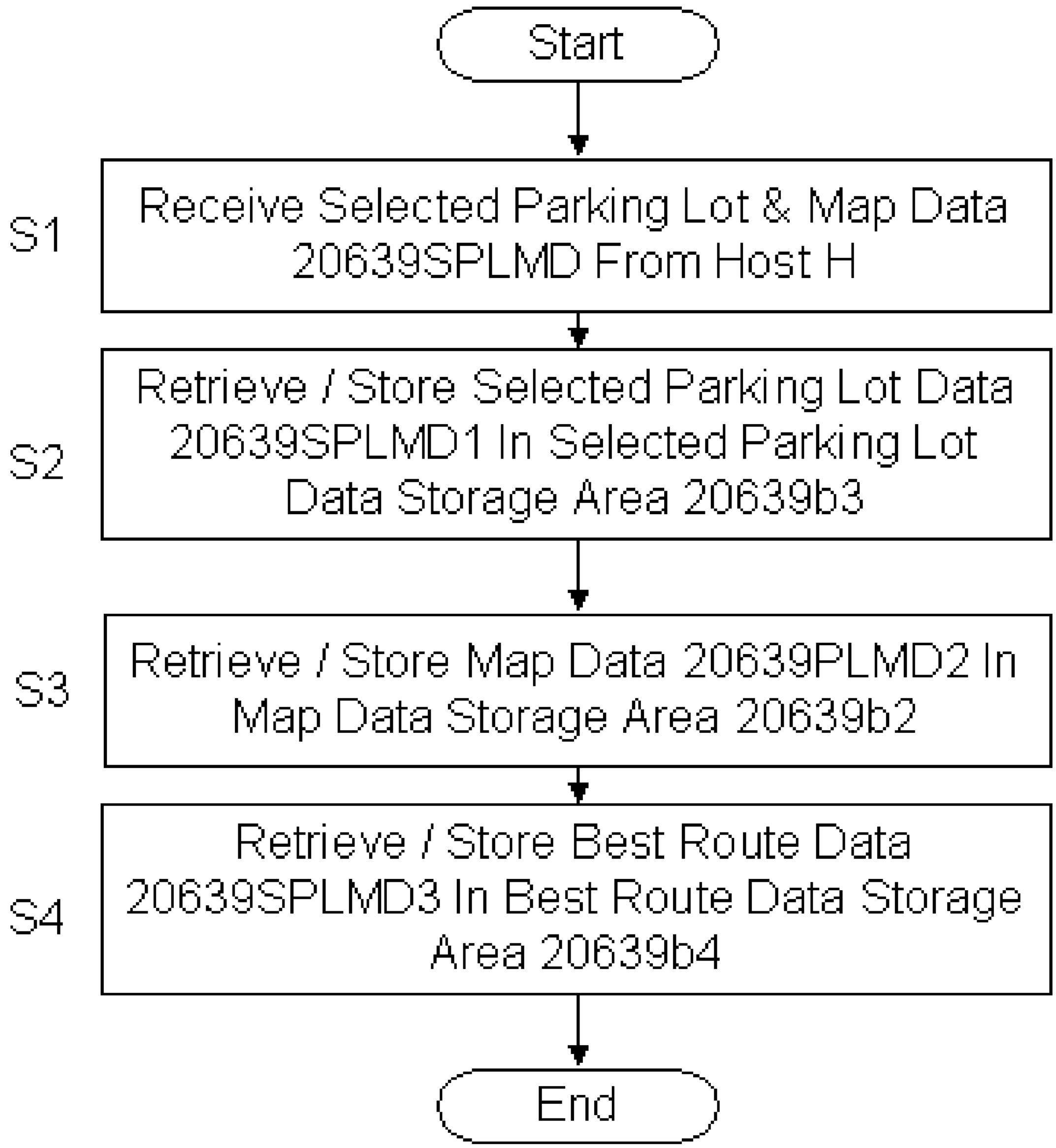

FIG. 829 is a flowchart illustrating an exemplary embodiment of the present invention.

Figure 830:
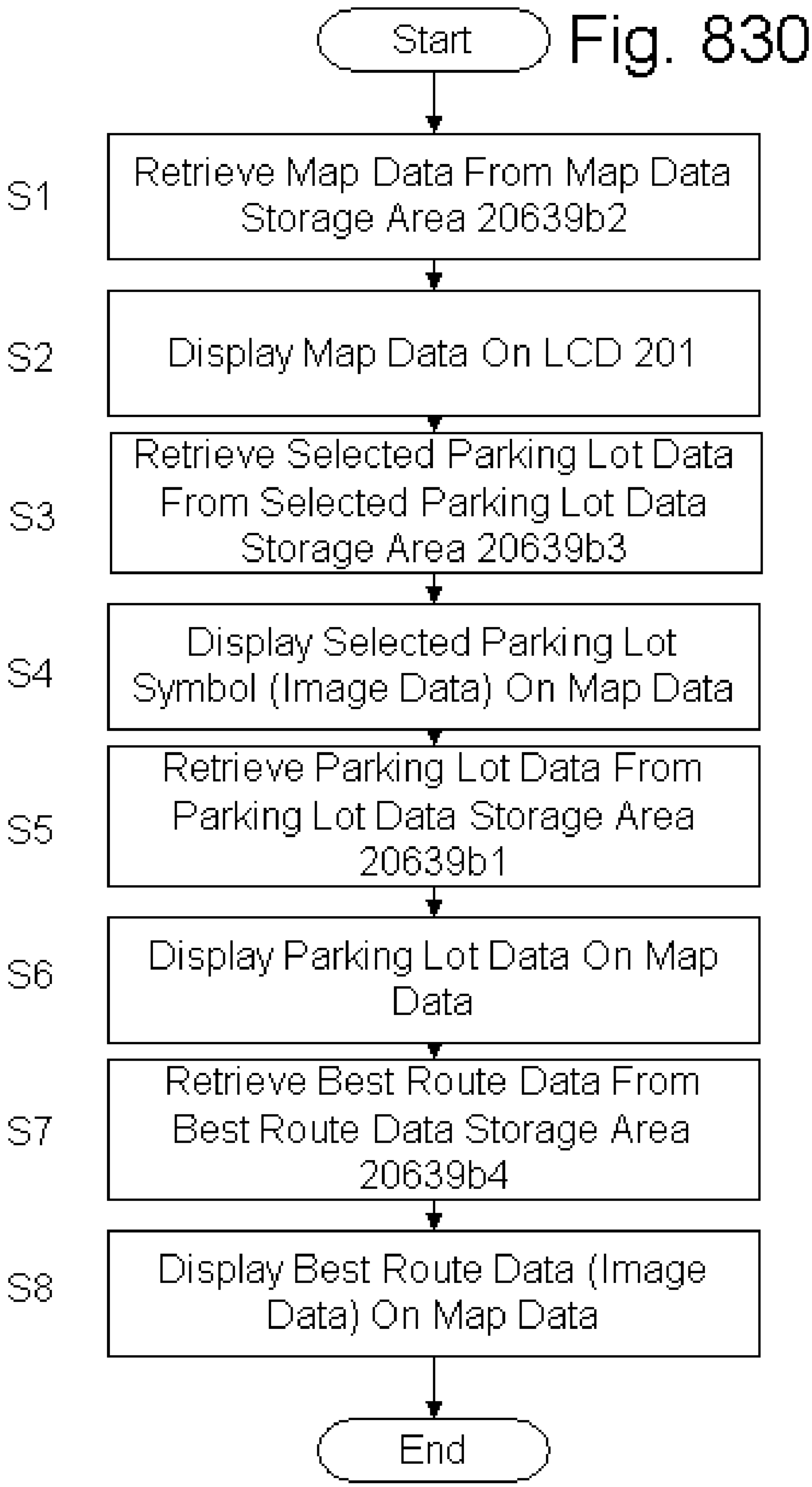

FIG. 830 is a flowchart illustrating an exemplary embodiment of the present invention.

Figure 831:
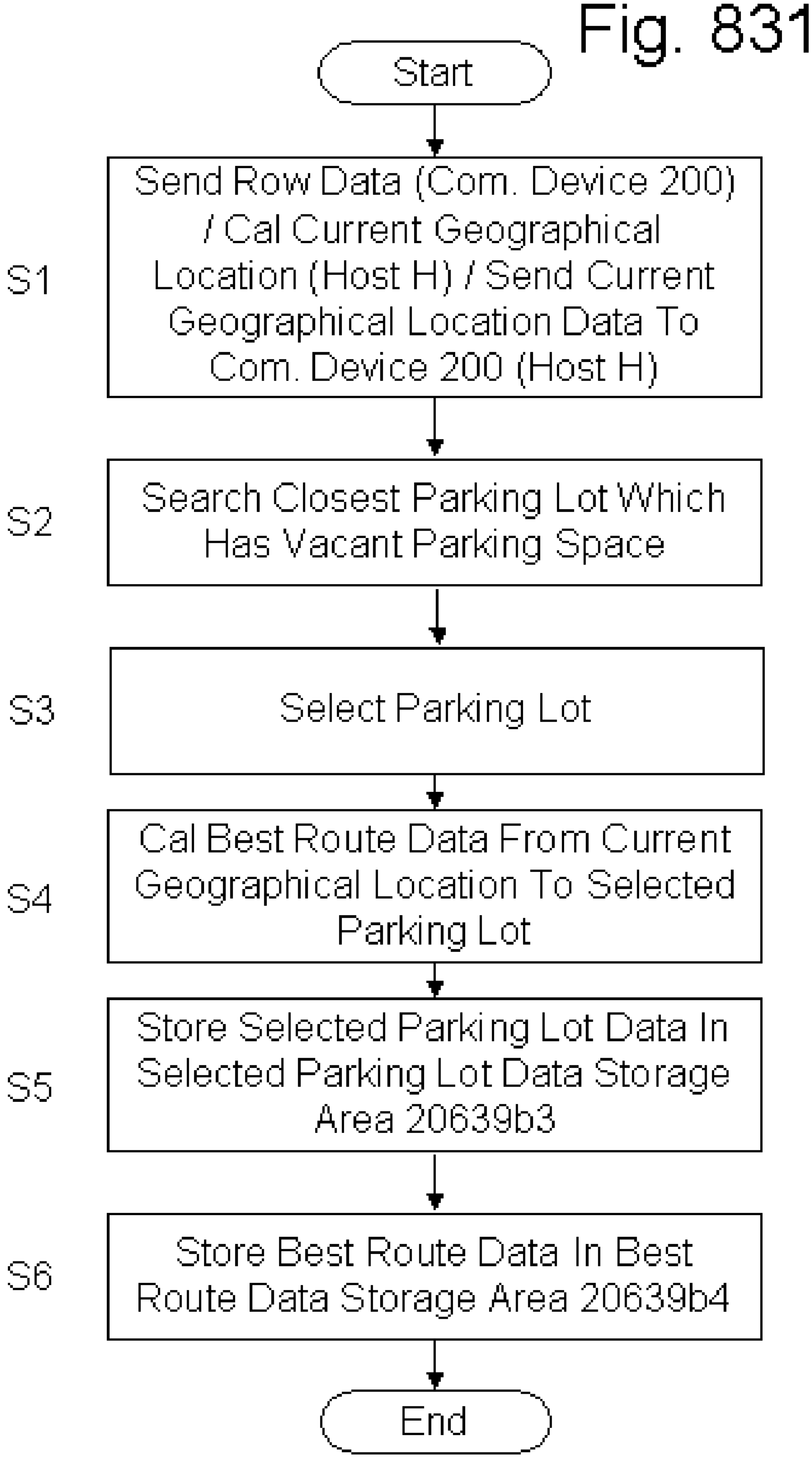

FIG. 831 is a flowchart illustrating an exemplary embodiment of the present invention.

Figure 832:
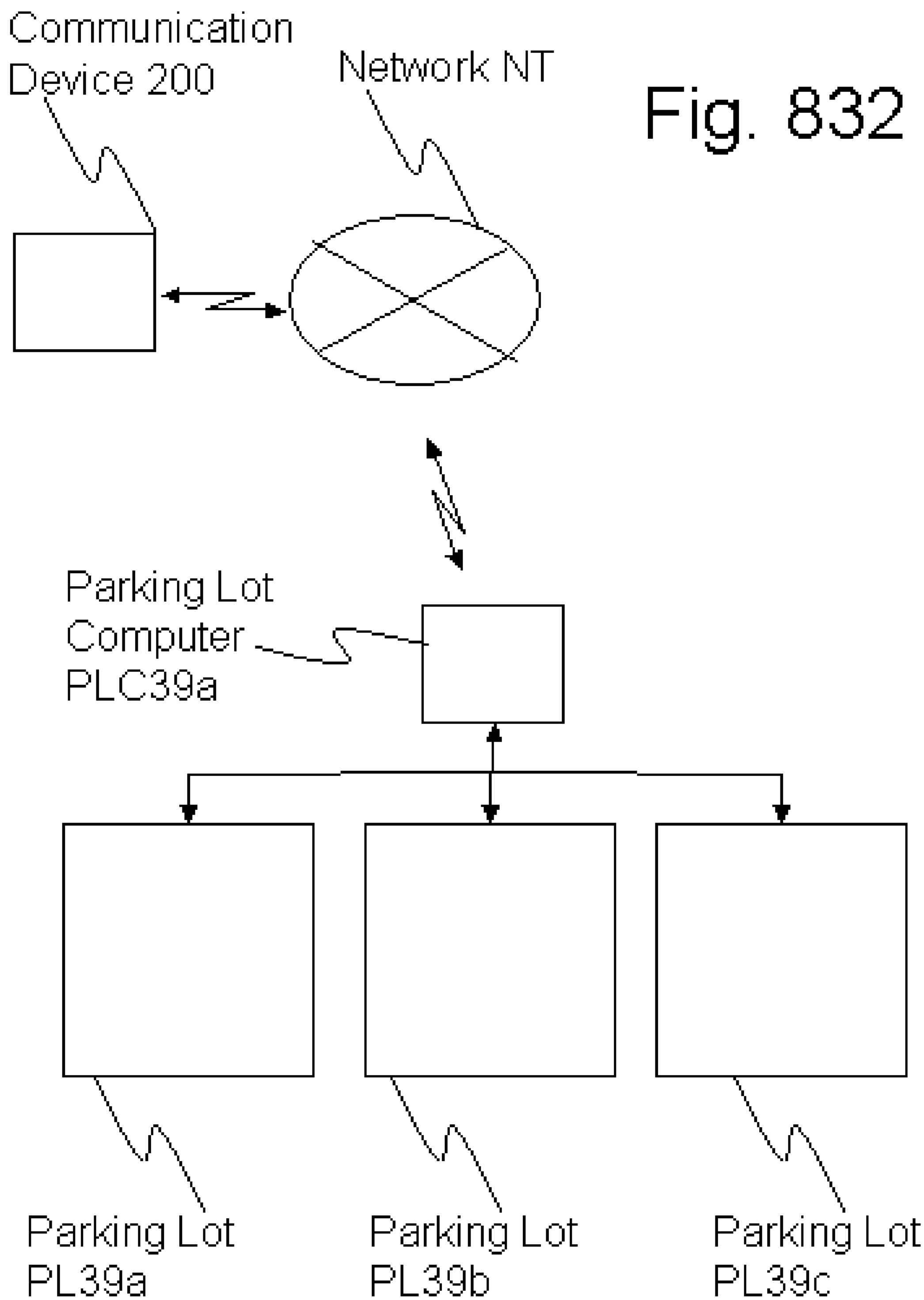

FIG. 832 is a simplified illustration illustrating an exemplary embodiment of the present invention.

Figure 833A:
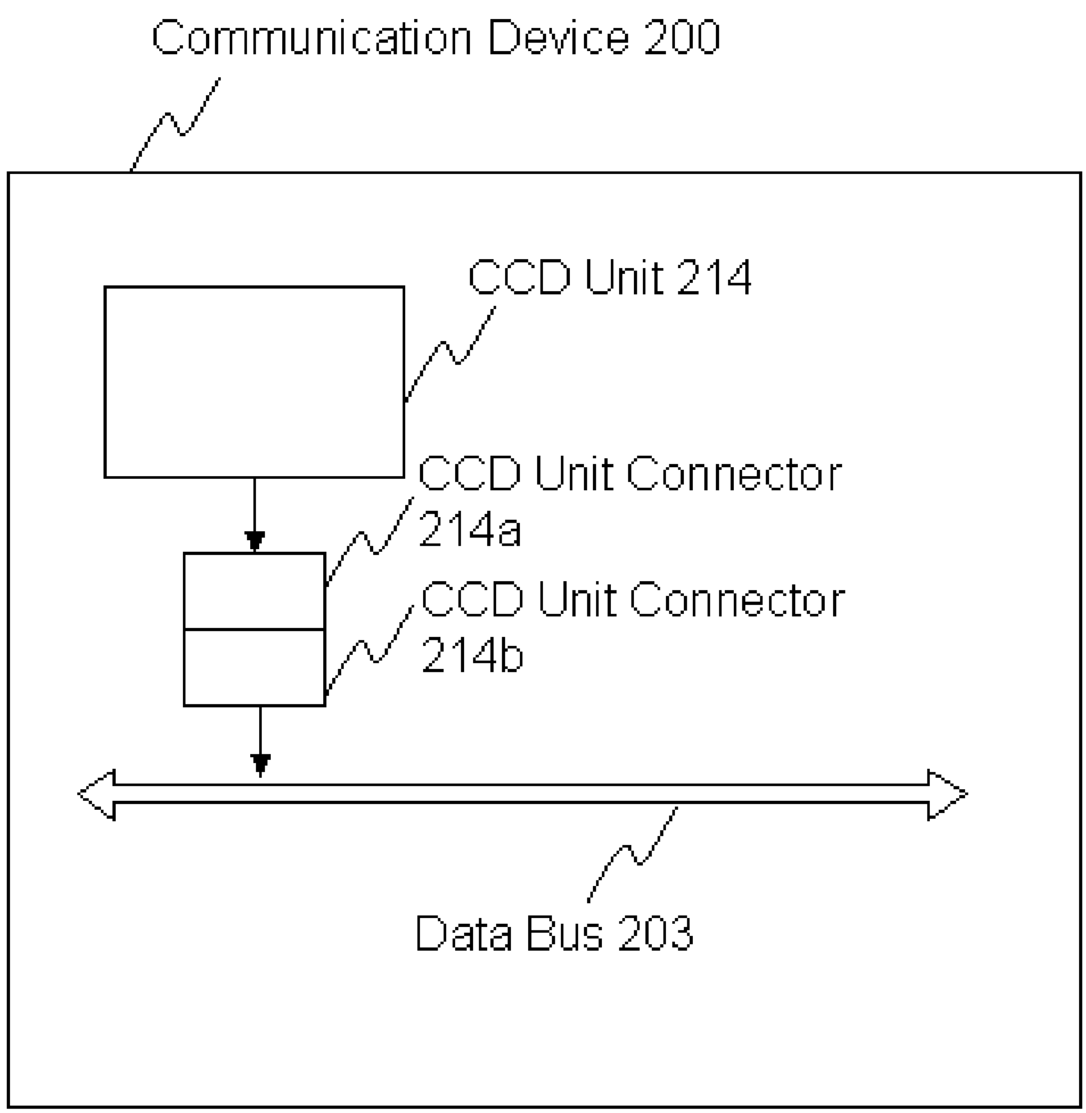

FIG. 833*a* is a block diagram illustrating an exemplary embodiment of the present invention.

Figure 833B:
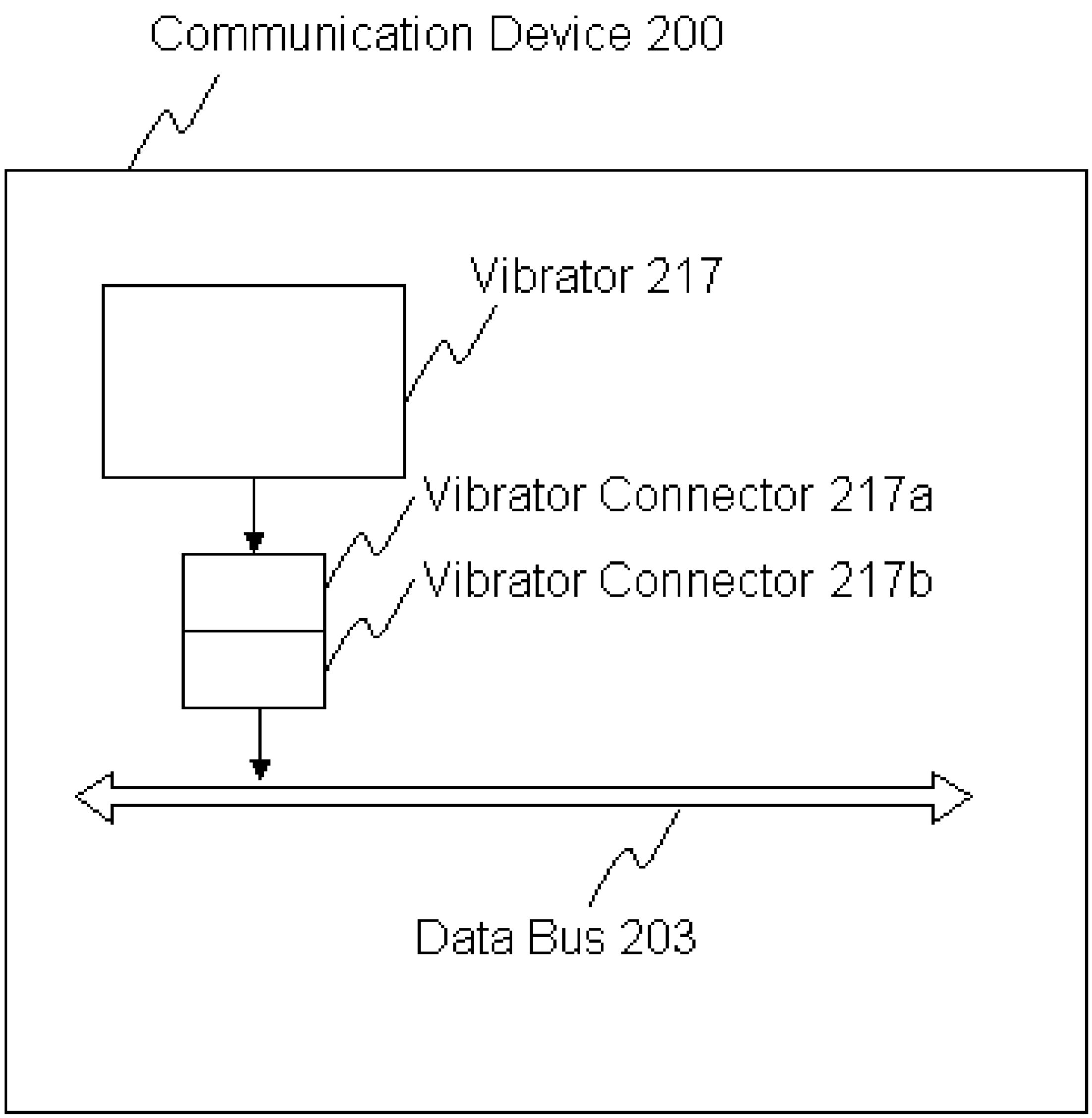

FIG. 833*b* is a block diagram illustrating an exemplary embodiment of the present invention.

Figure 833C:
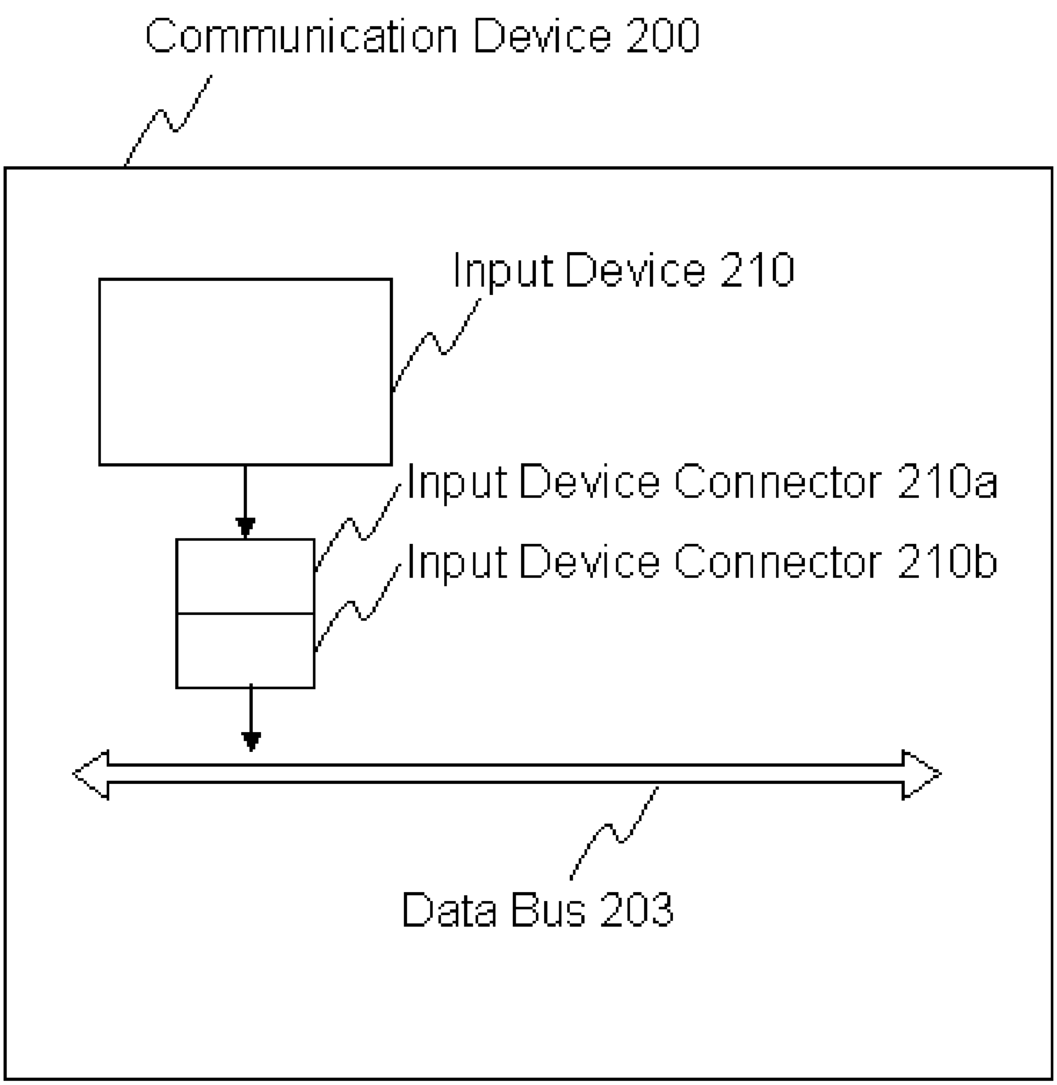

FIG. 833*c* is a block diagram illustrating an exemplary embodiment of the present invention.

Figure 833D:
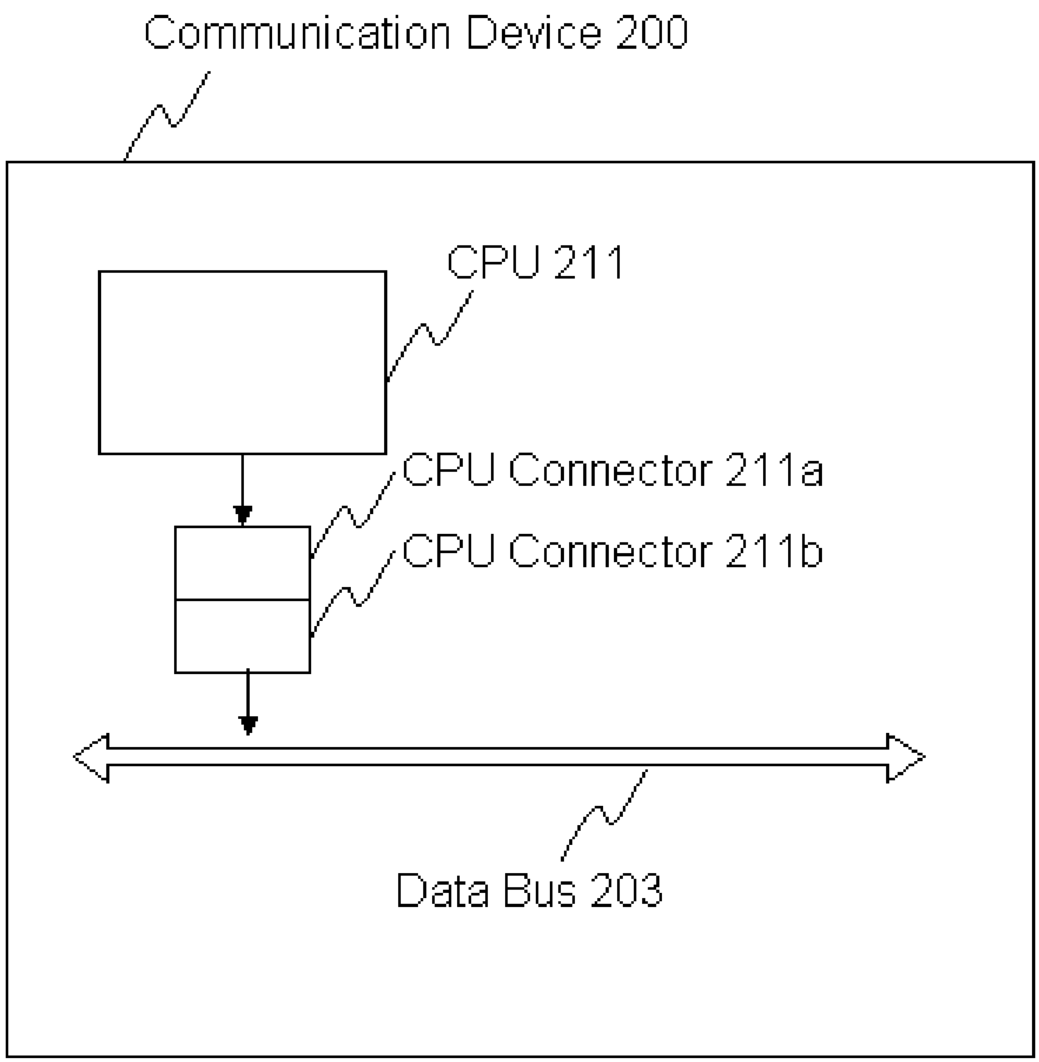

FIG. 833*d* is a block diagram illustrating an exemplary embodiment of the present invention.

Figure 833E:
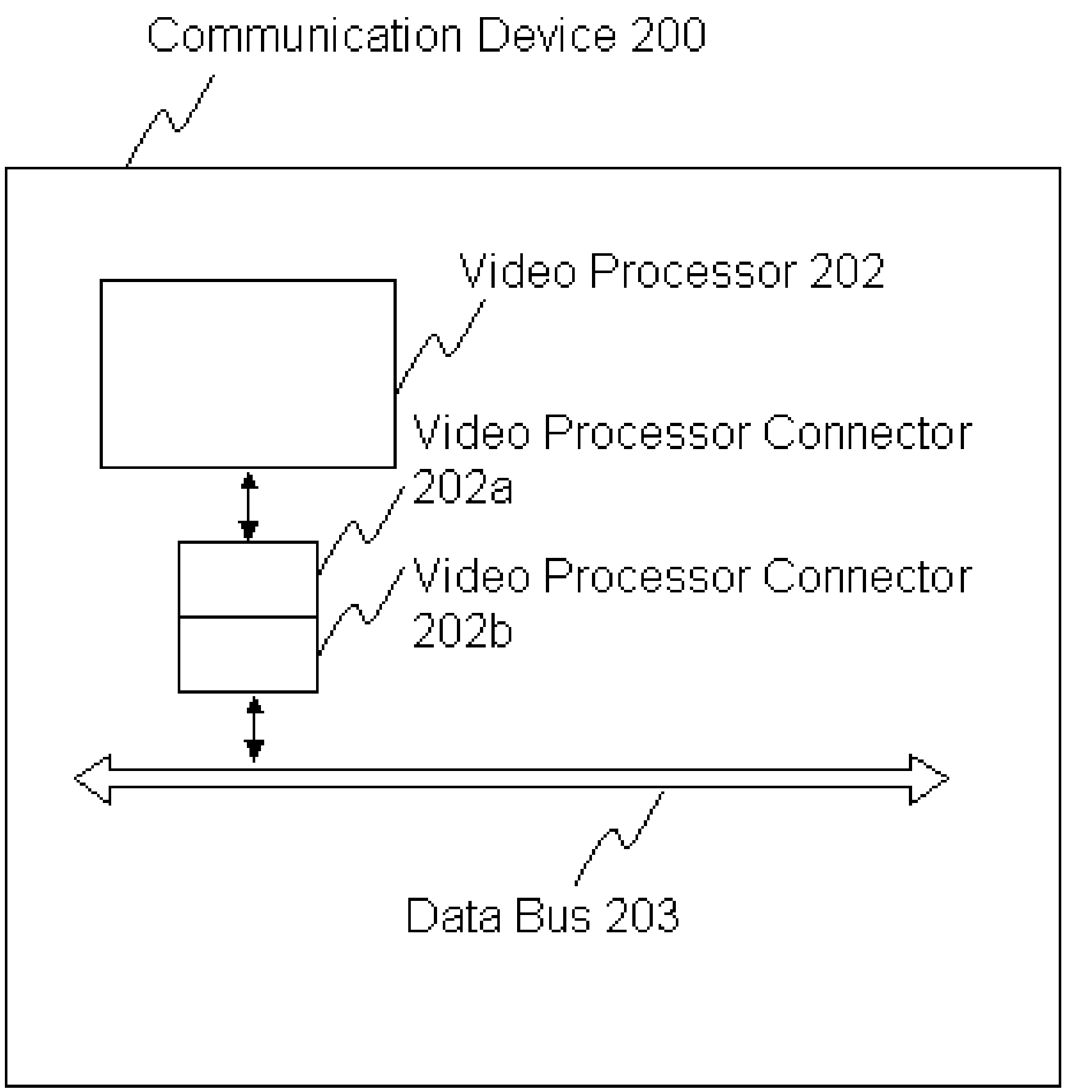

FIG. 833*e* is a block diagram illustrating an exemplary embodiment of the present invention.

Figure 833F:
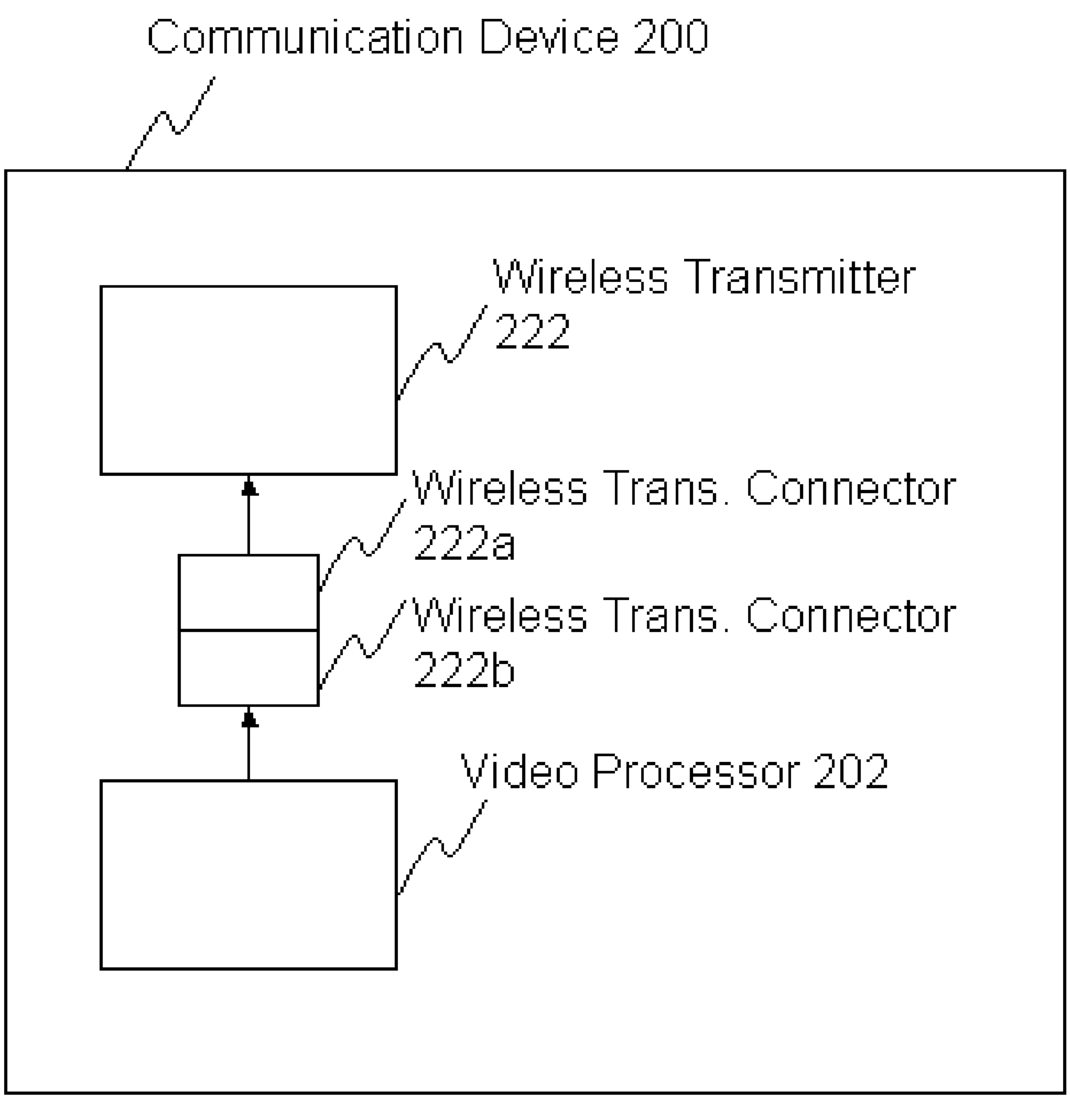

FIG. 833*f* is a block diagram illustrating an exemplary embodiment of the present invention.

Figure 833G:
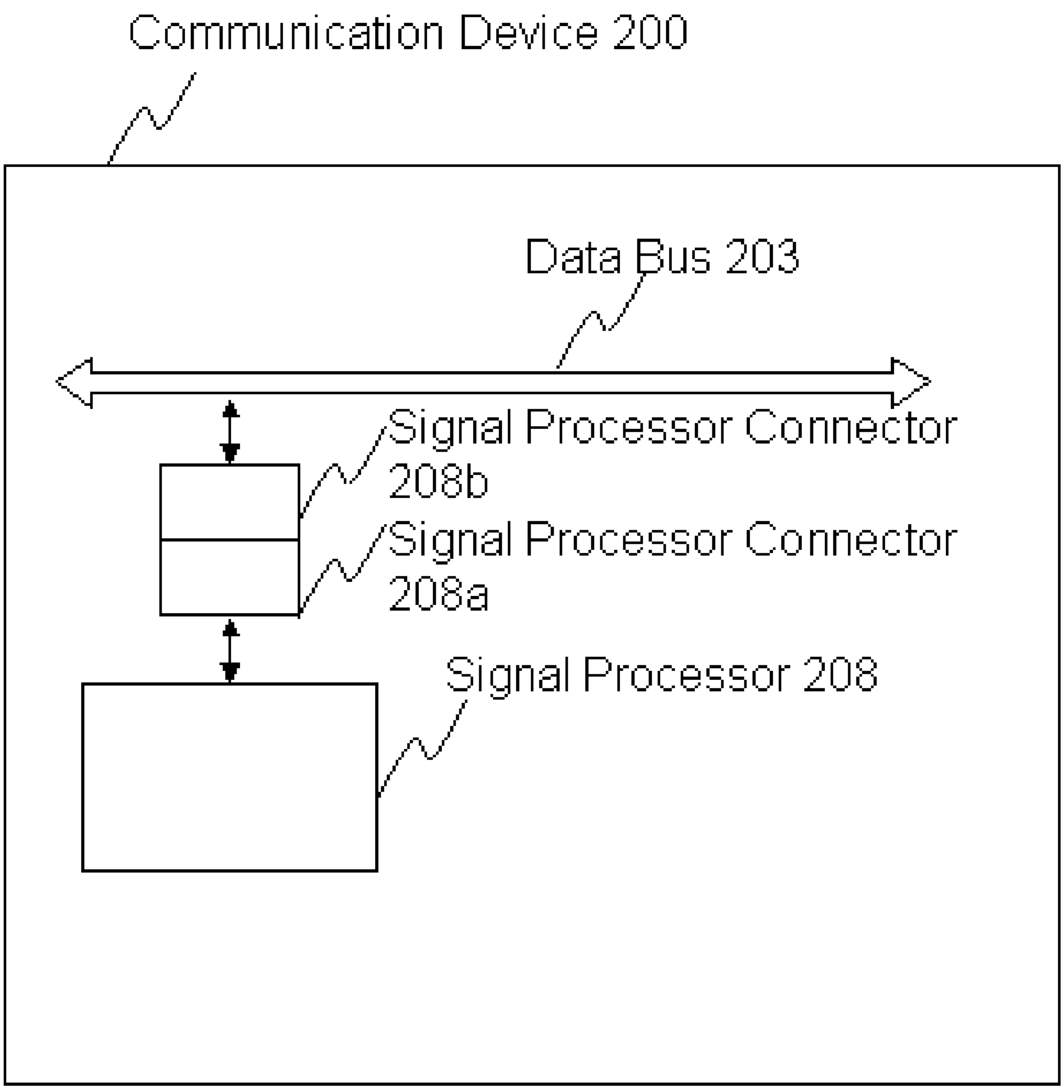

FIG. 833*g* is a block diagram illustrating an exemplary embodiment of the present invention.

Figure 833H:
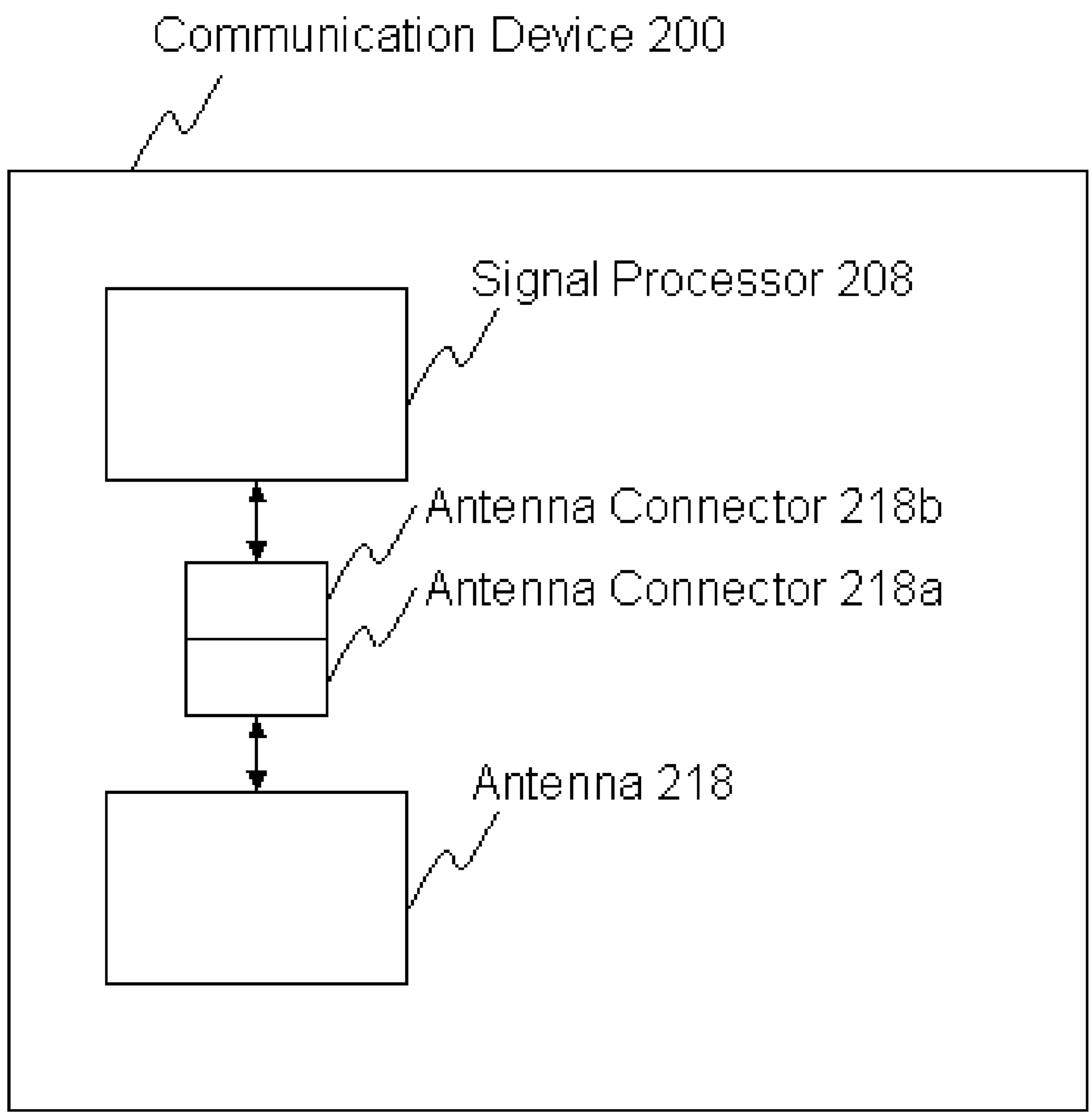

FIG. 833*h* is a block diagram illustrating an exemplary embodiment of the present invention.

Figure 833I:
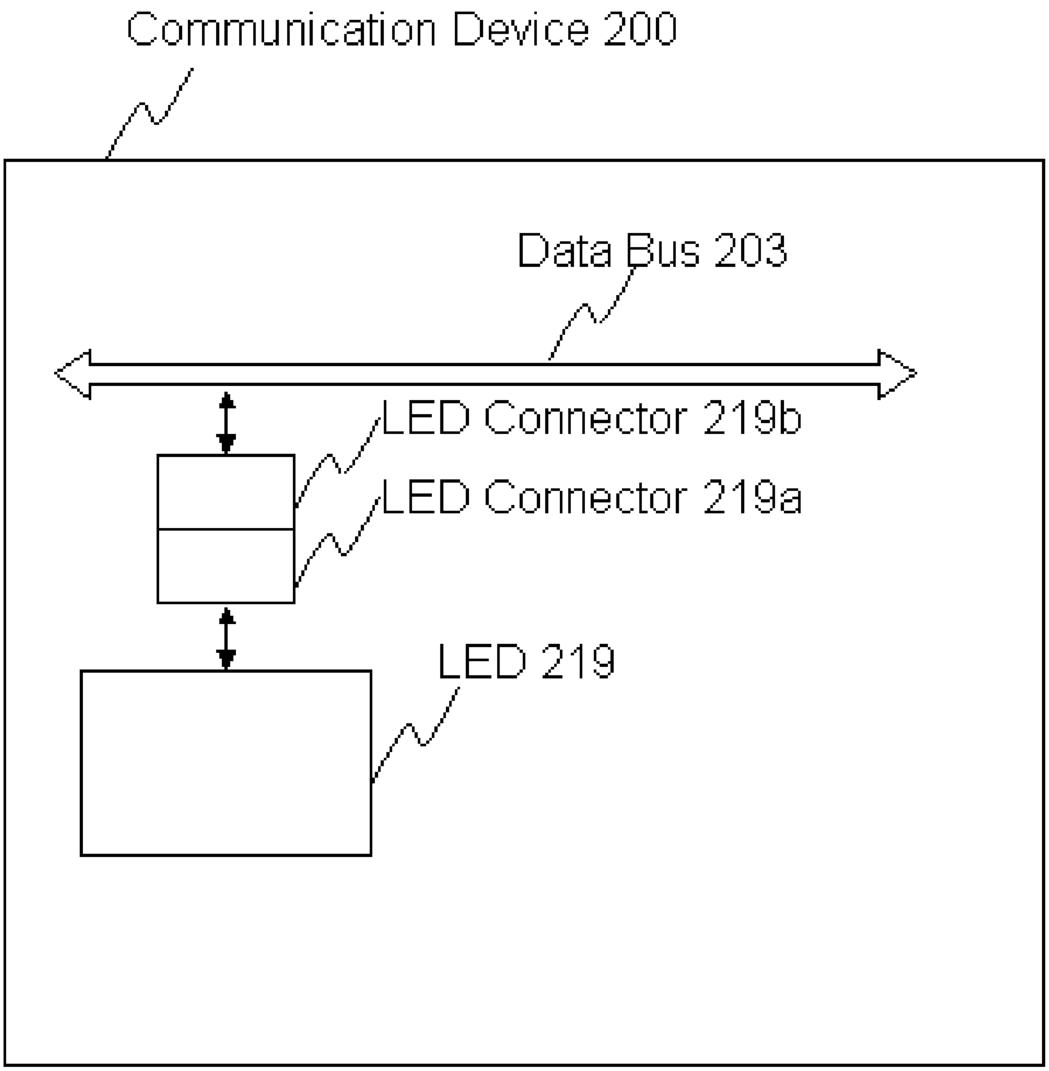

FIG. 833*i* is a block diagram illustrating an exemplary embodiment of the present invention.

Figure 833J:
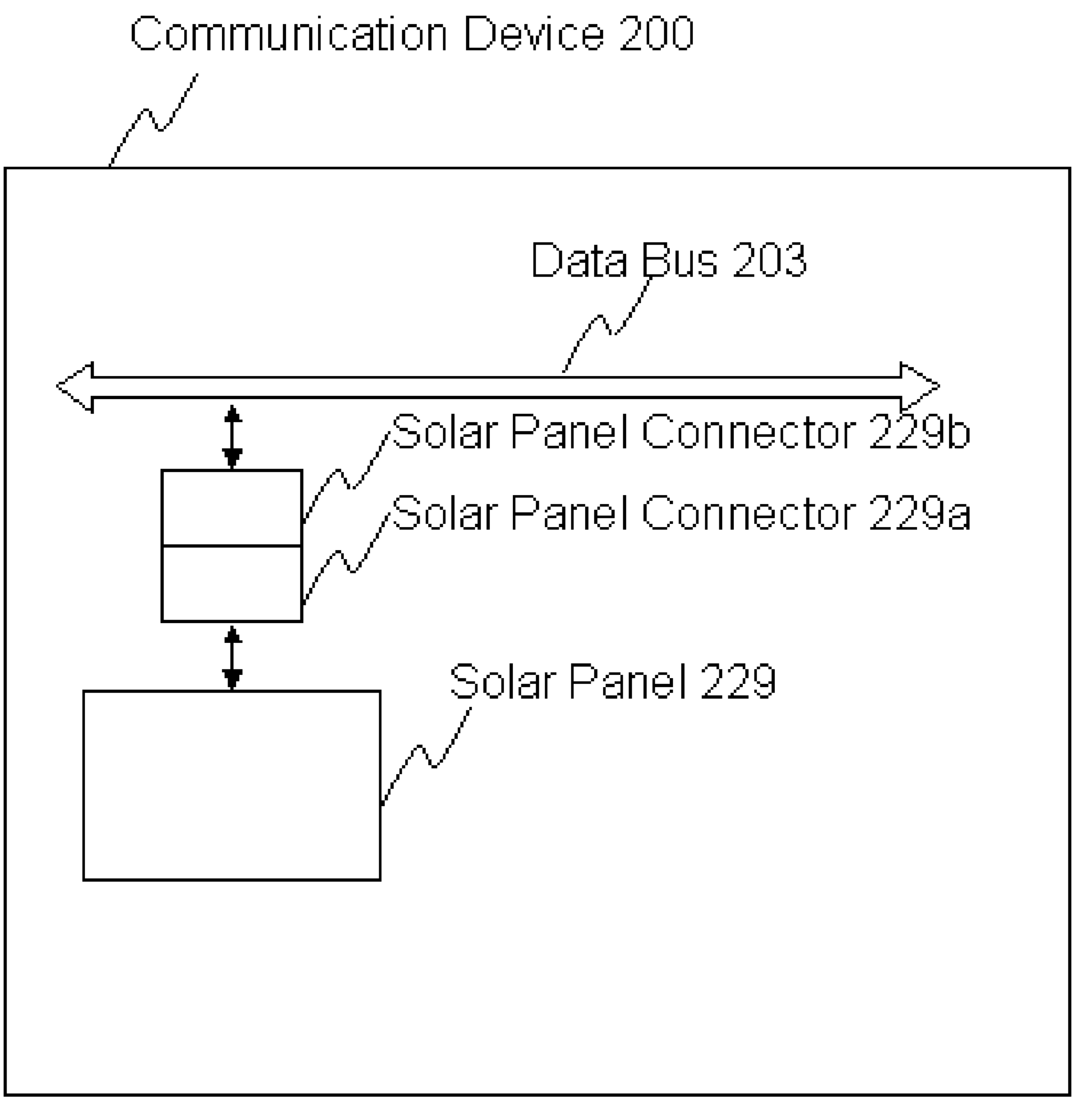

FIG. 833*j* is a block diagram illustrating an exemplary embodiment of the present invention.

Figure 833K:
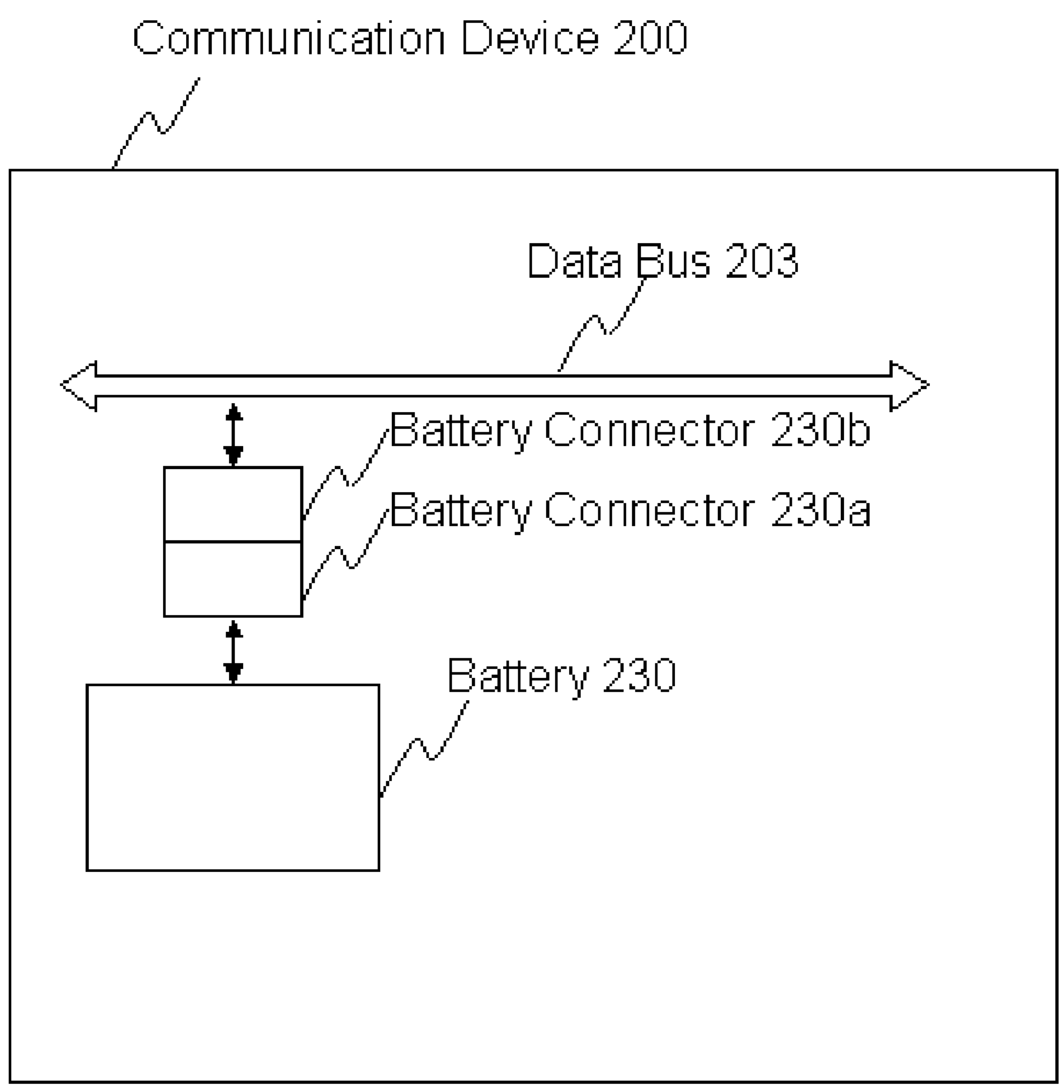
Figure 833I:
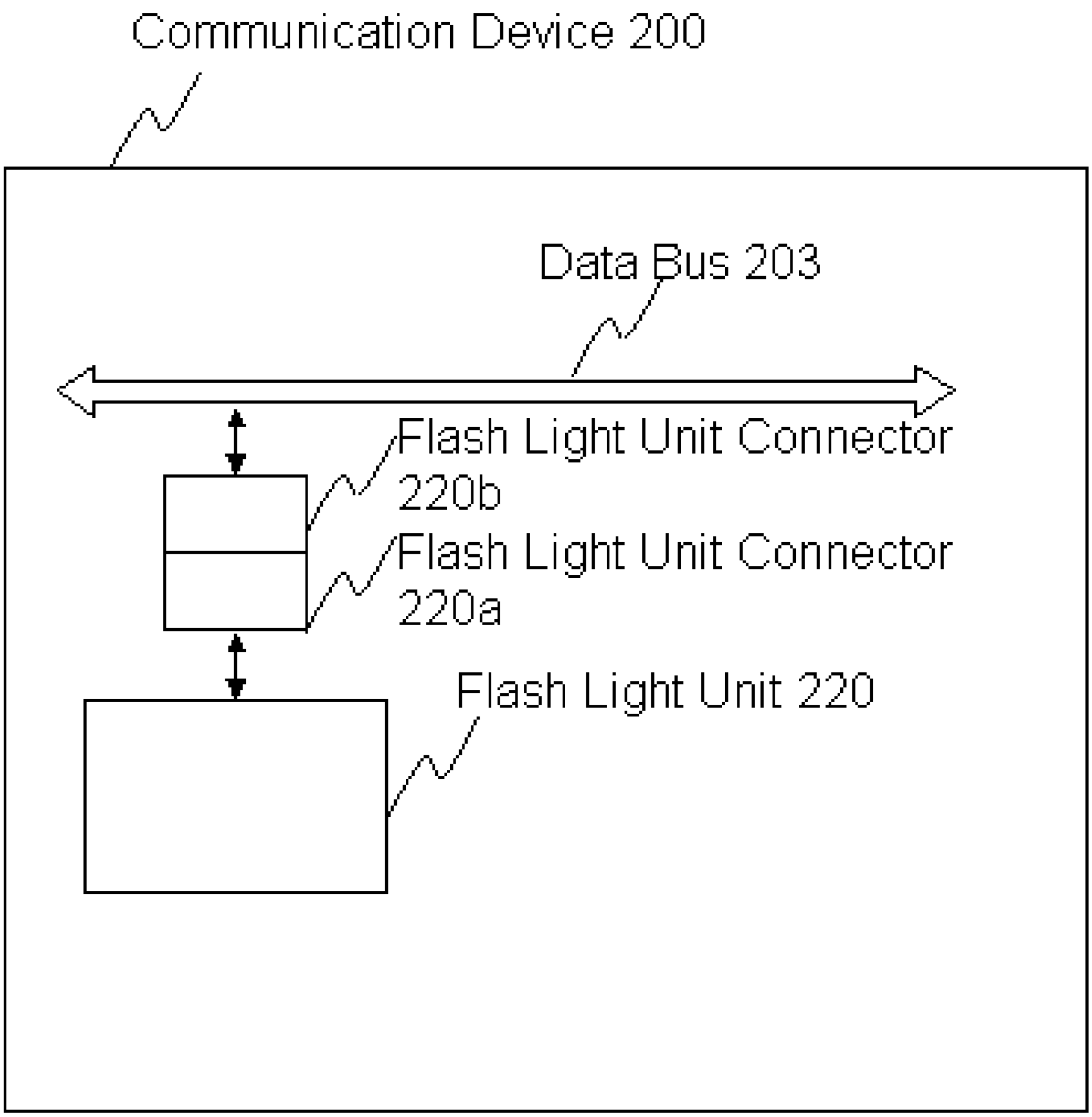

FIG. 833*k* is a block diagram illustrating an exemplary embodiment of the present invention.

FIG. 833*l* is a block diagram illustrating an exemplary embodiment of the present invention.

Figure 833M:
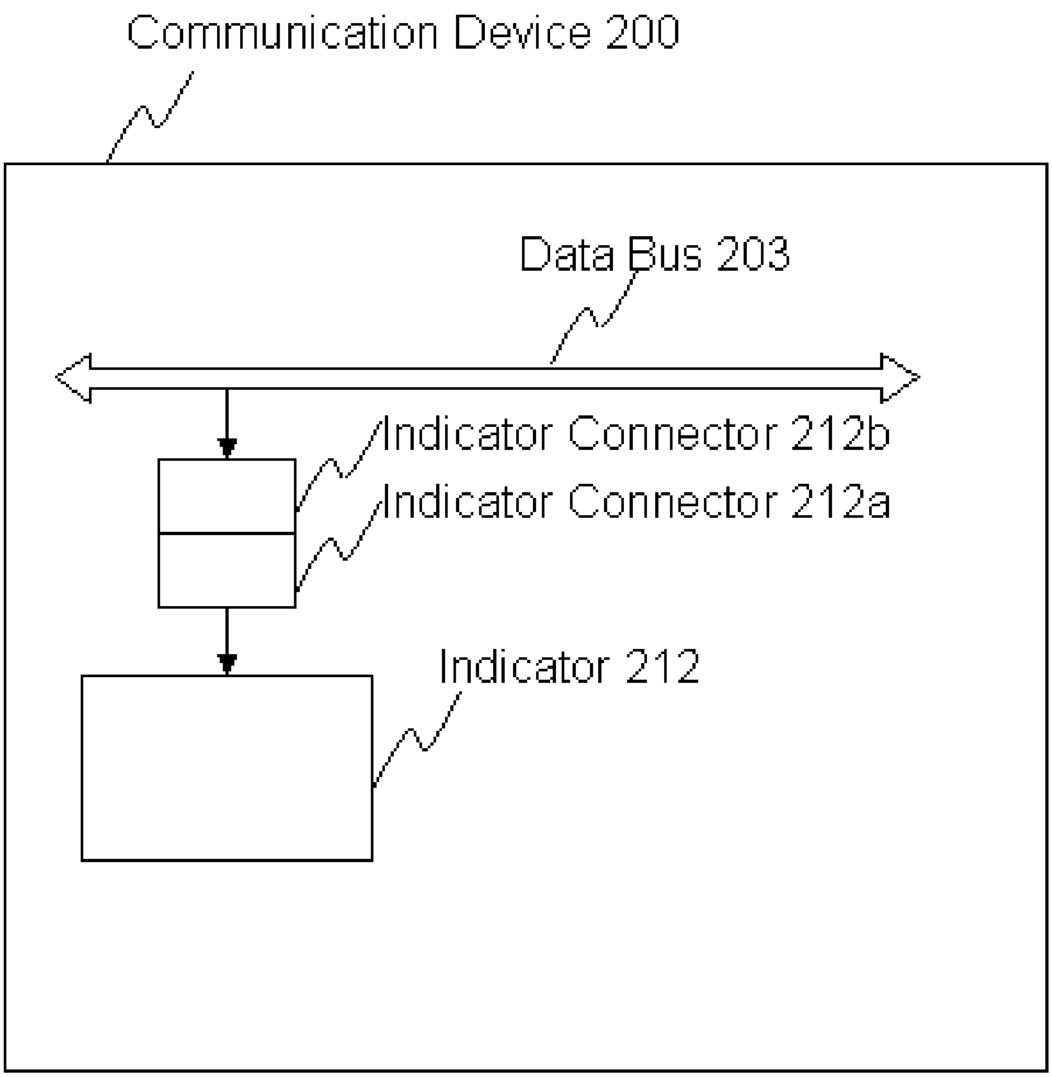

FIG. 833*m* is a block diagram illustrating an exemplary embodiment of the present invention.

Figure 833N:
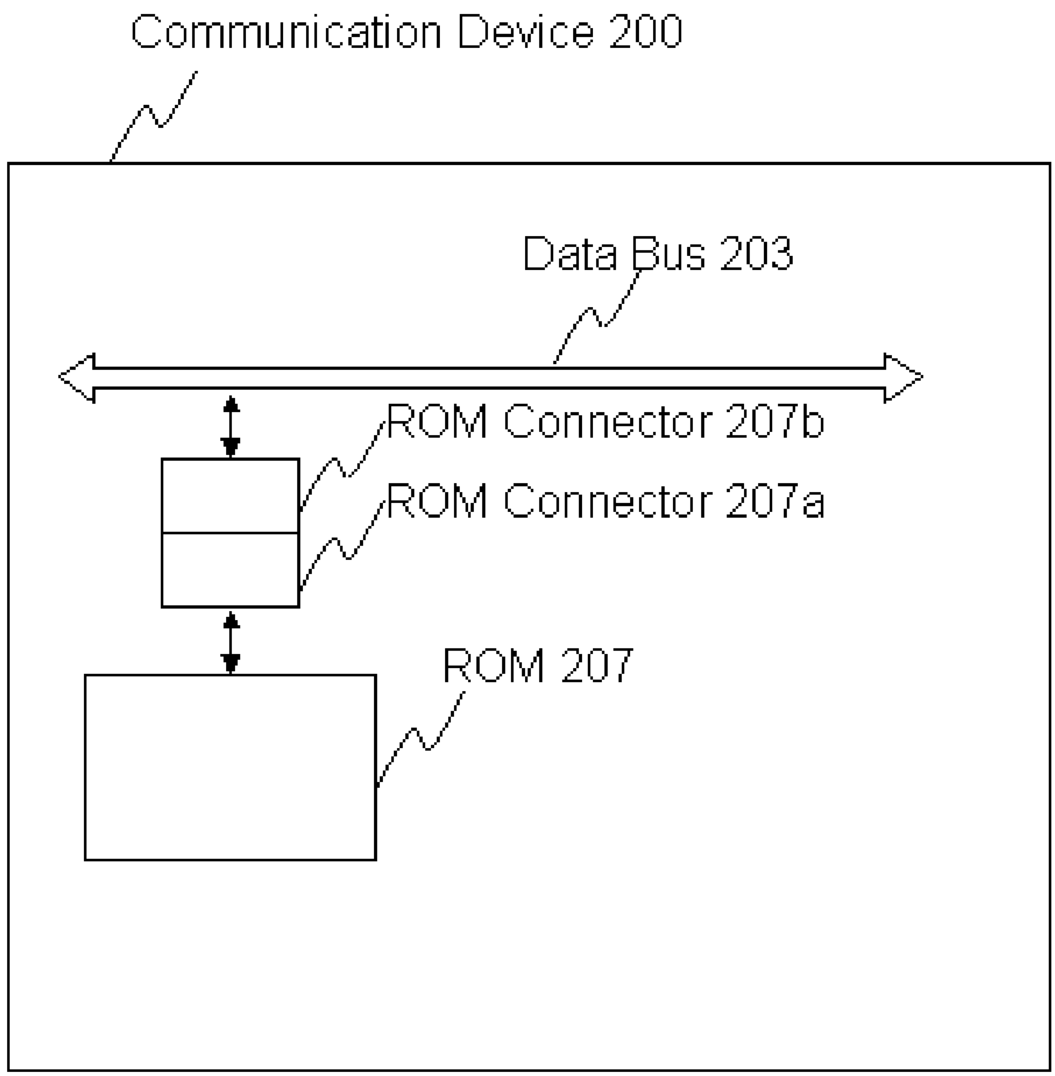

FIG. 833*n* is a block diagram illustrating an exemplary embodiment of the present invention.

Figure 833O:
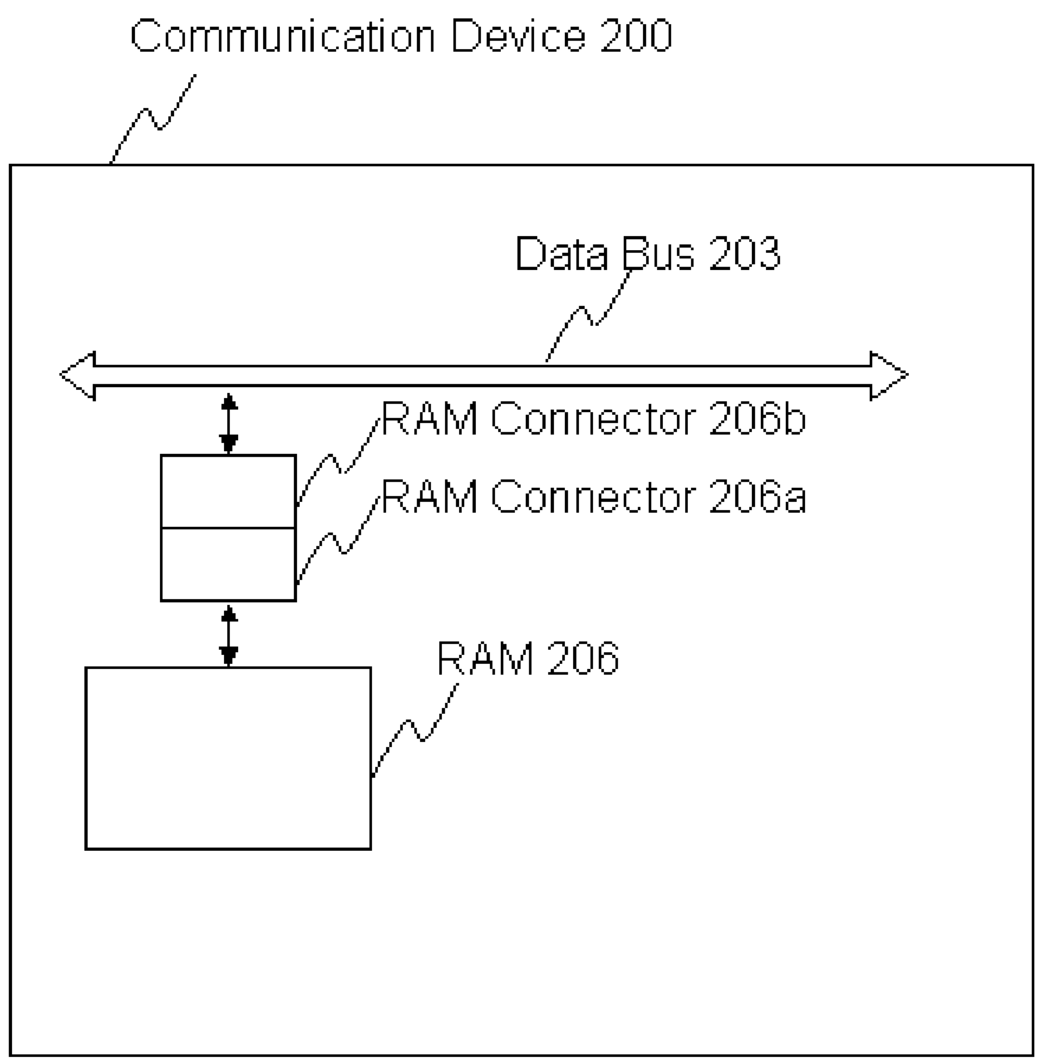

FIG. 833*o* is a block diagram illustrating an exemplary embodiment of the present invention.

Figure 833P:
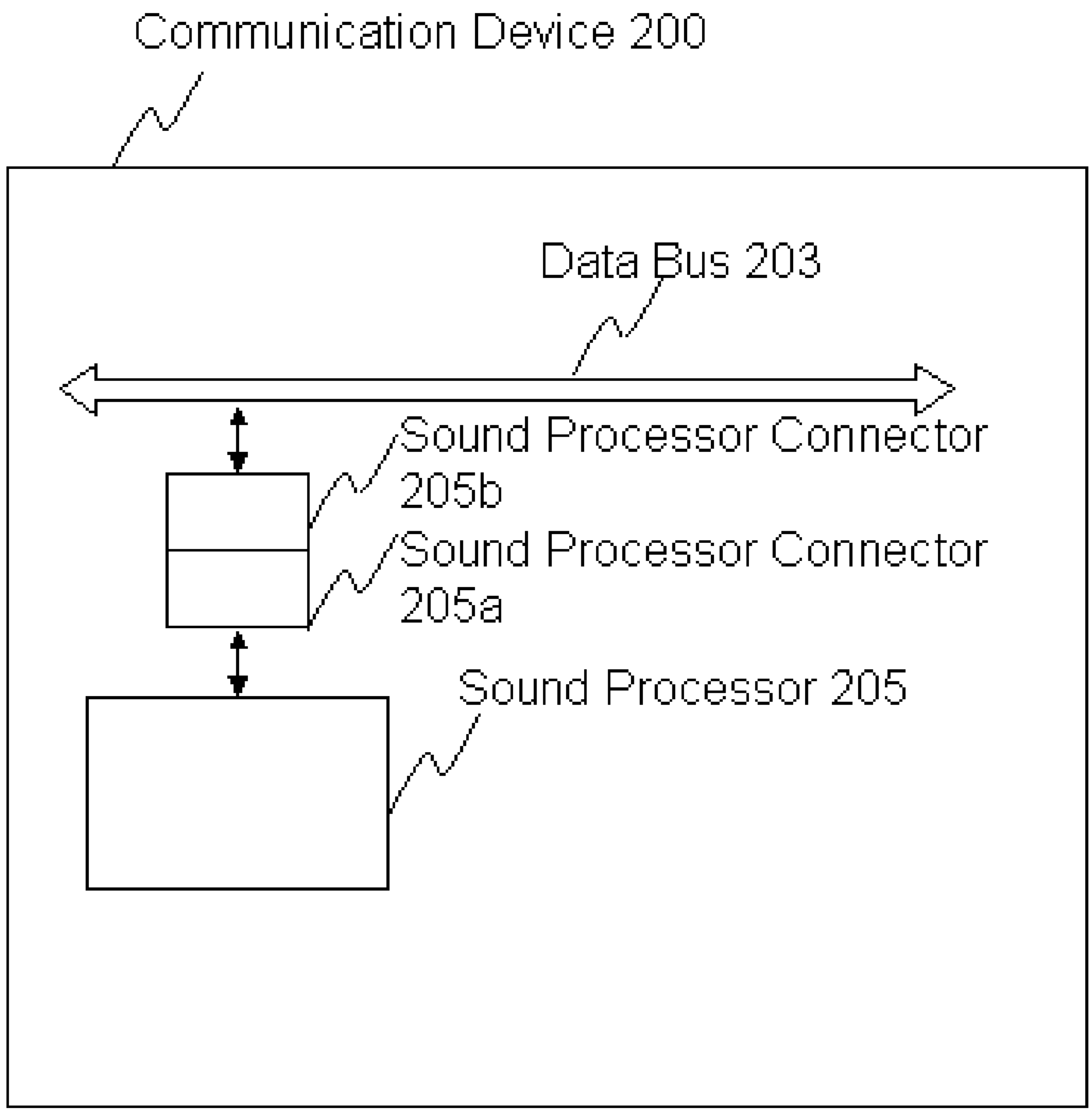

FIG. 833*p* is a block diagram illustrating an exemplary embodiment of the present invention.

Figure 833Q:
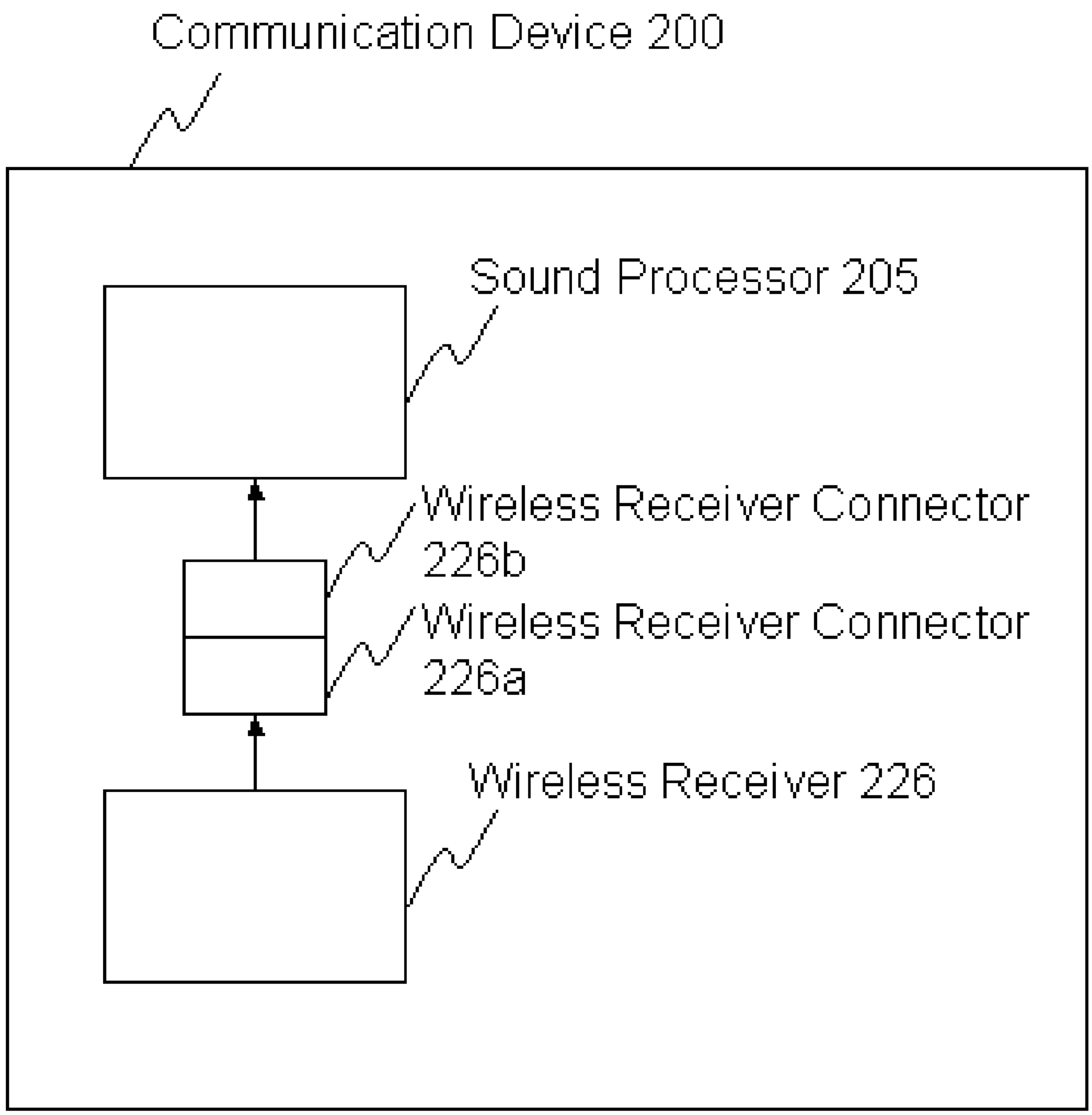

FIG. 833*q* is a block diagram illustrating an exemplary embodiment of the present invention.

Figure 833R:
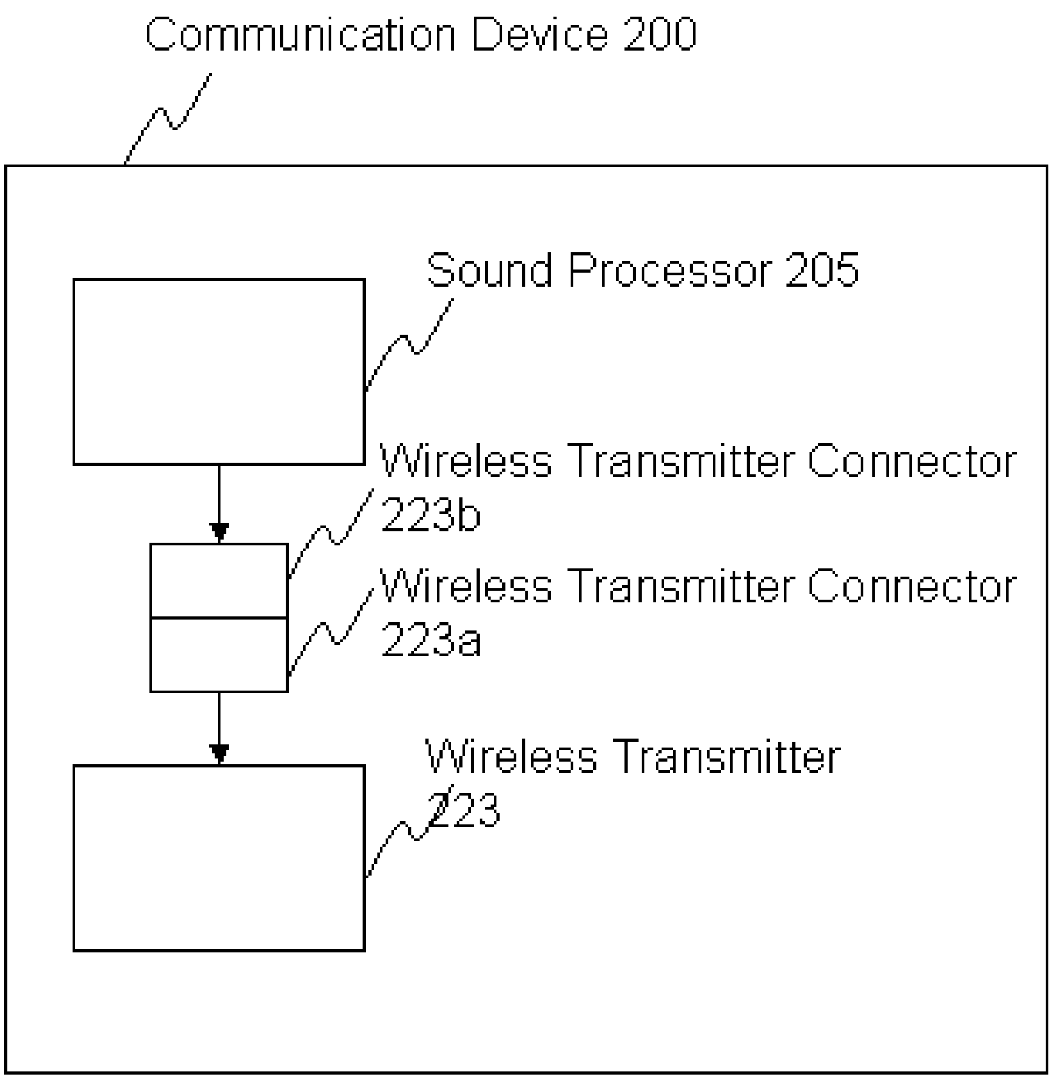

FIG. 833*r* is a block diagram illustrating an exemplary embodiment of the present invention.

Figure 833S:
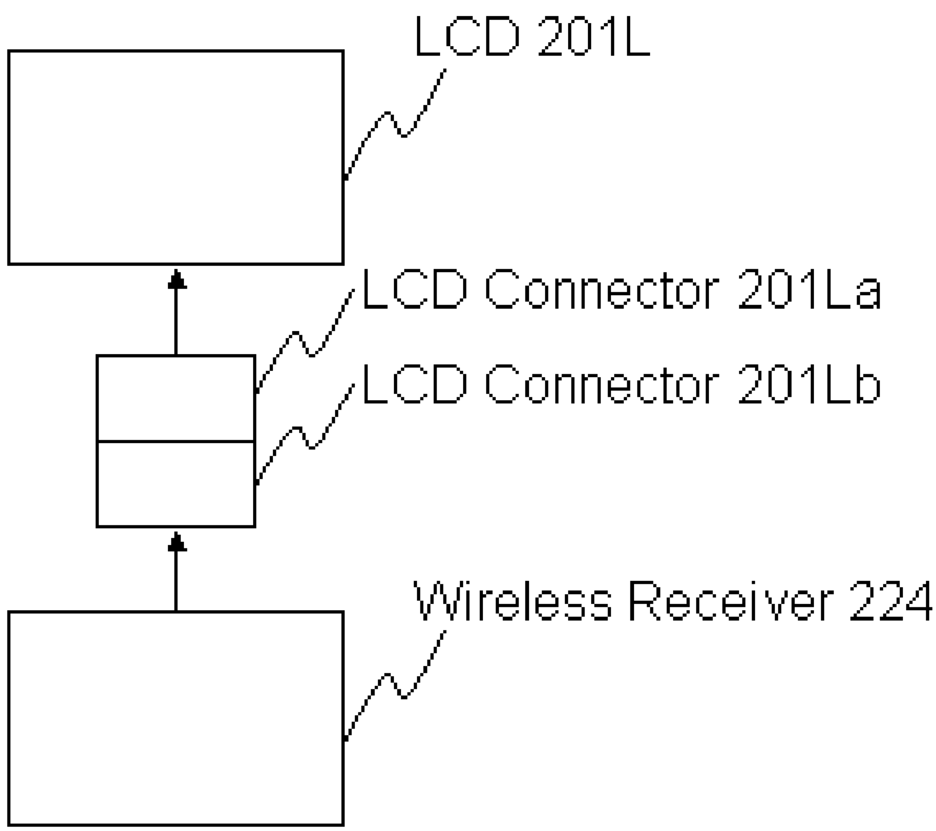

FIG. 833*s* is a block diagram illustrating an exemplary embodiment of the present invention.

Figure 833T:
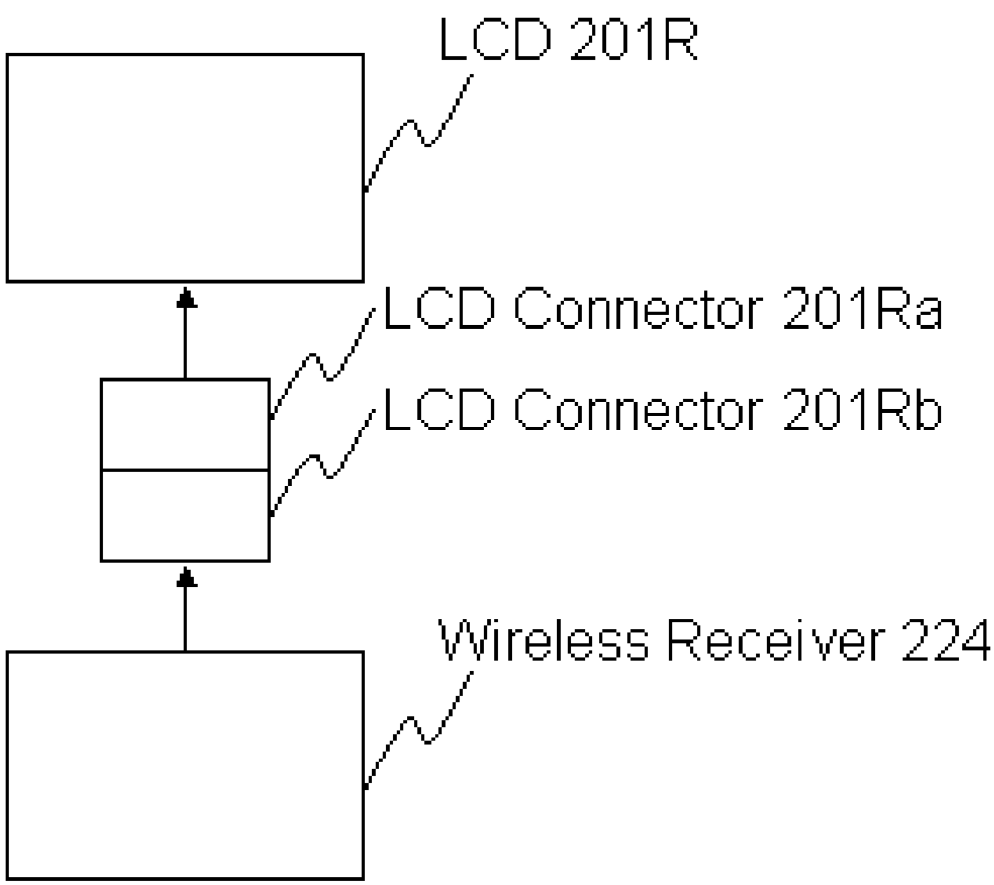

FIG. 833*t* is a block diagram illustrating an exemplary embodiment of the present invention.

Figure 833U:
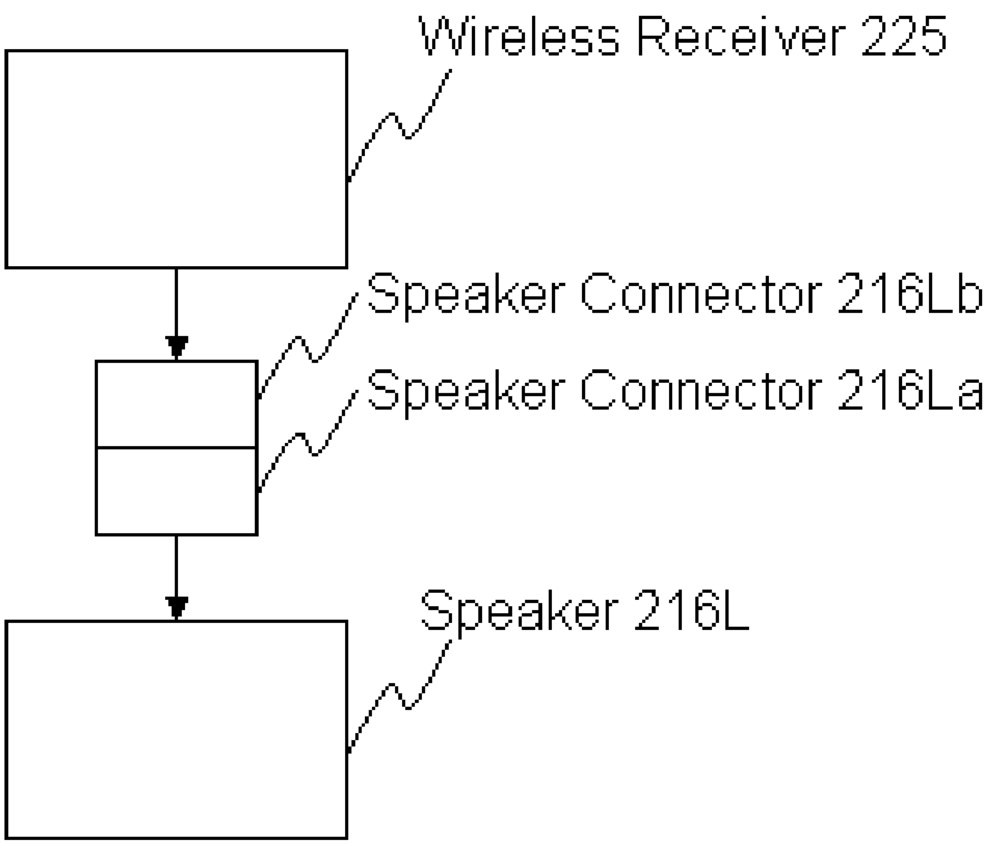

FIG. 833*u* is a block diagram illustrating an exemplary embodiment of the present invention.

Figure 833V:
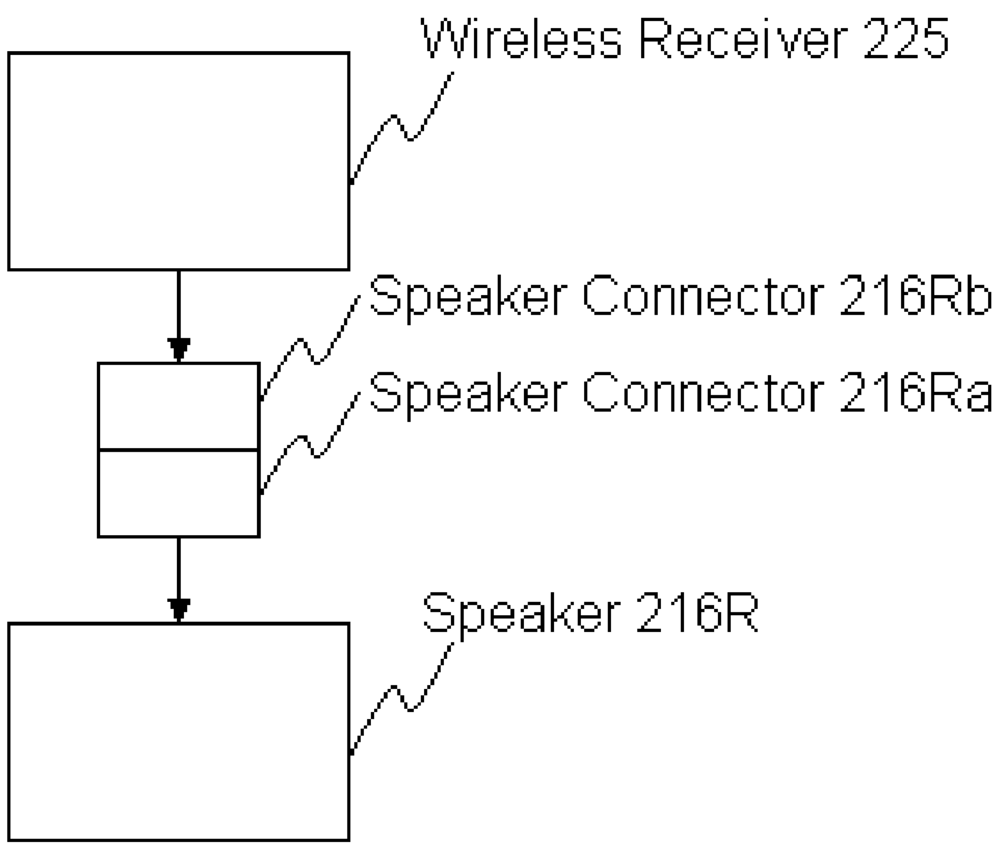

FIG. 833*v* is a block diagram illustrating an exemplary embodiment of the present invention.

Figure 833W:
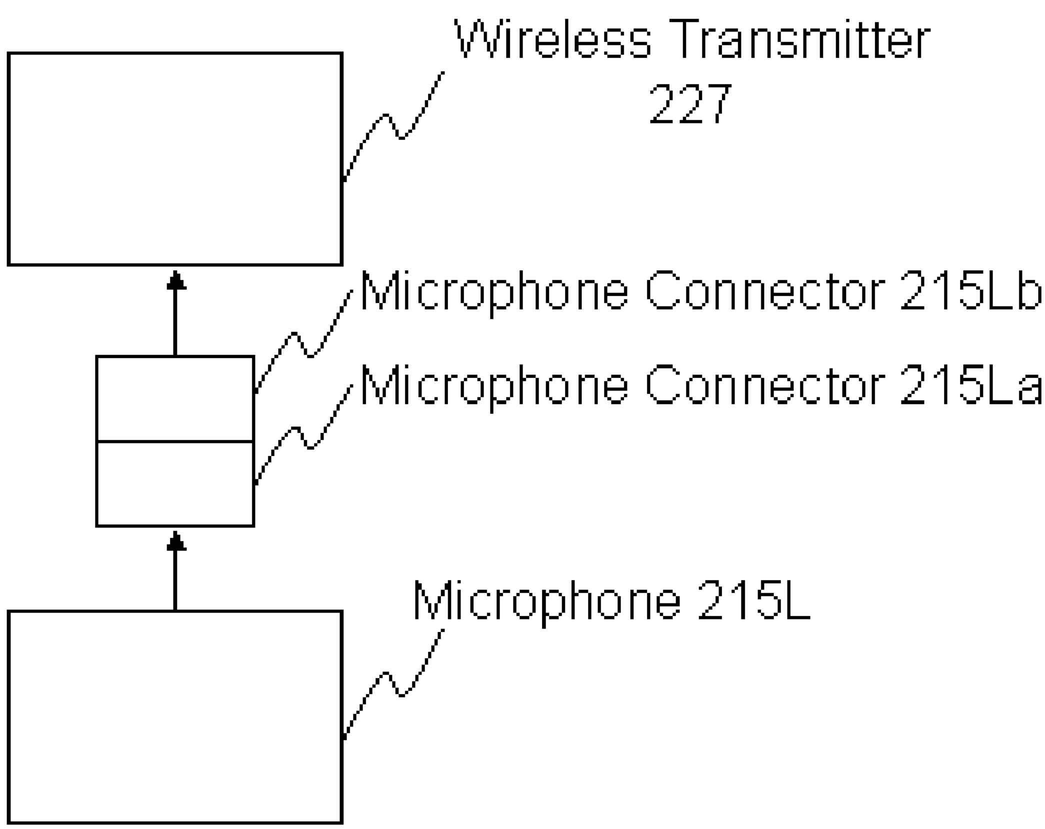

FIG. 833*w* is a block diagram illustrating an exemplary embodiment of the present invention.

Figure 833X:
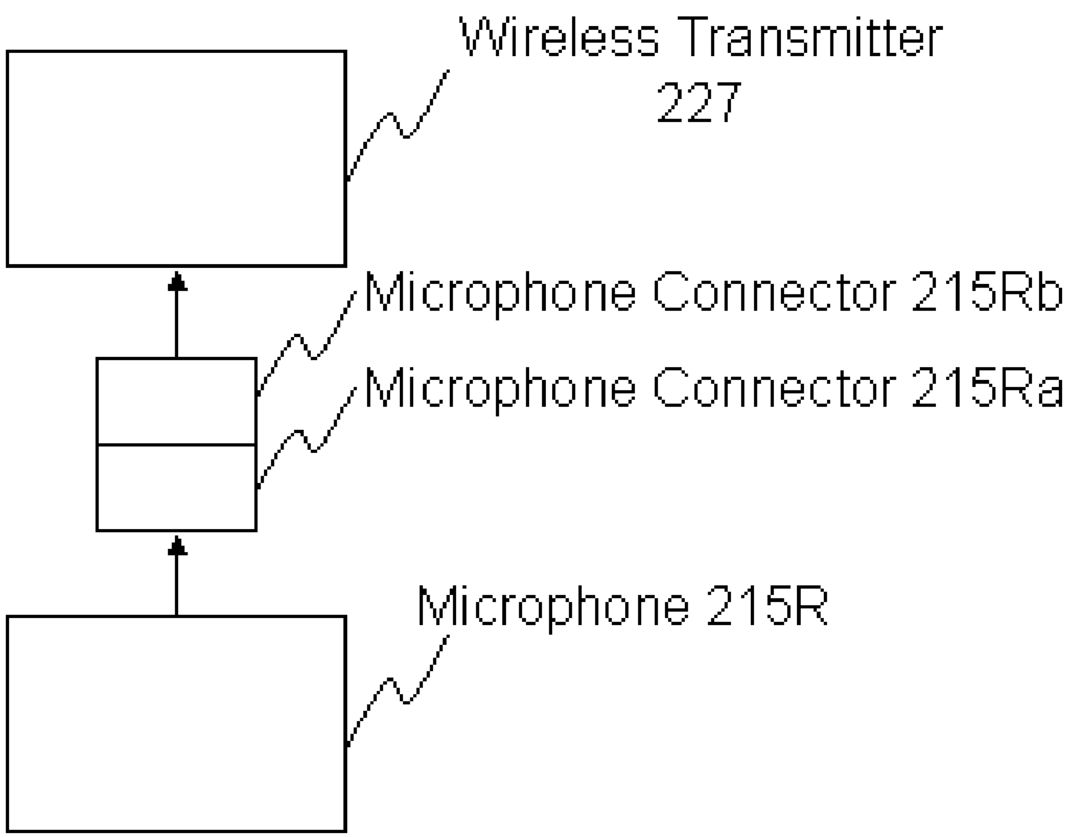

FIG. 833*x* is a block diagram illustrating an exemplary embodiment of the present invention.

Figure 834:
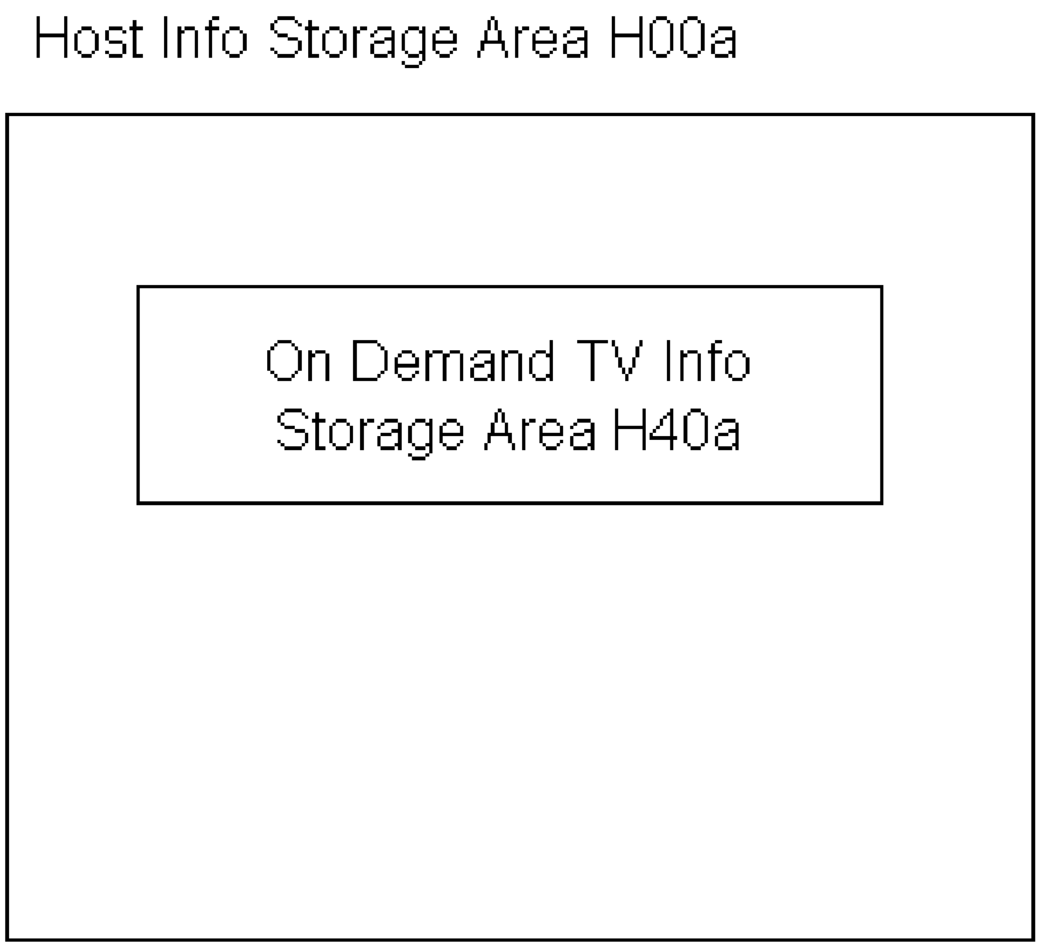

FIG. 834 is a block diagram illustrating an exemplary embodiment of the present invention.

Figure 835:
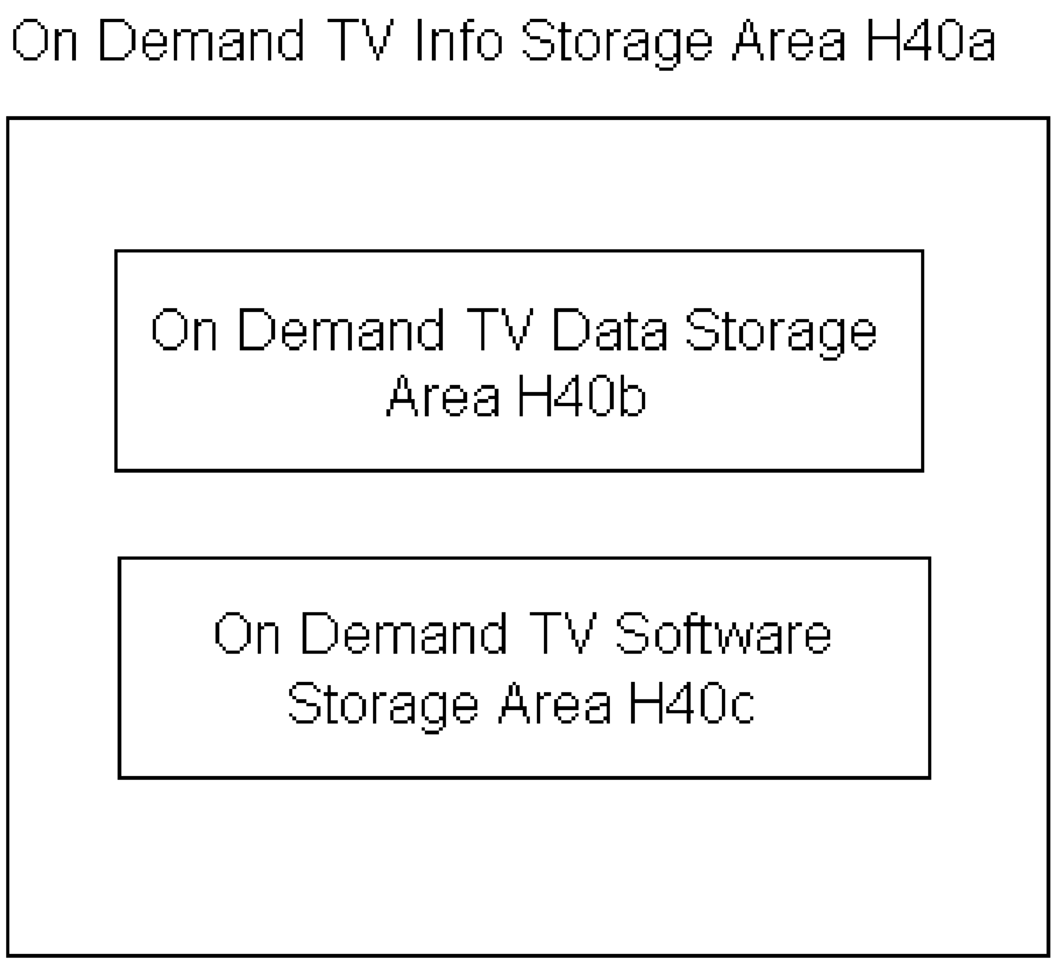

FIG. 835 is a block diagram illustrating an exemplary embodiment of the present invention.

Figure 836:
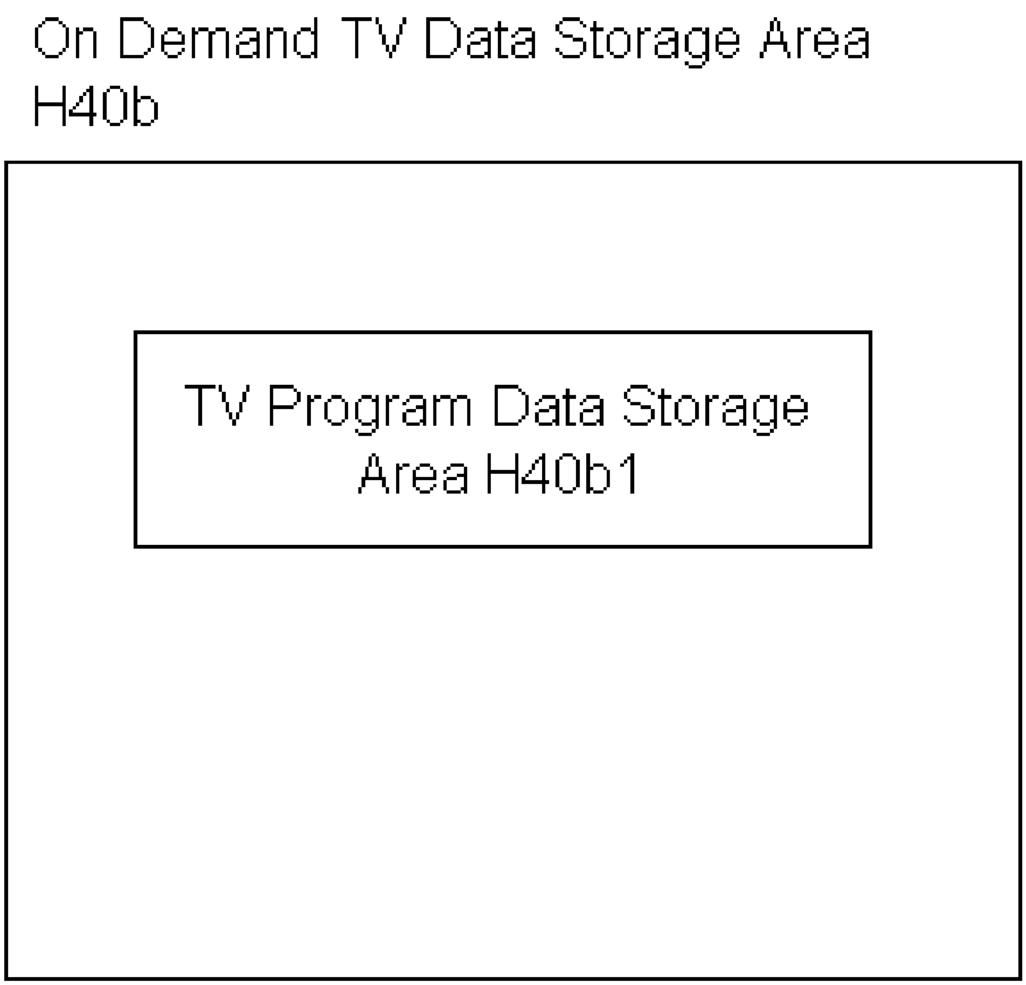

FIG. 836 is a block diagram illustrating an exemplary embodiment of the present invention.

FIG. 837 is a block diagram illustrating an exemplary embodiment of the present invention.

FIG. 838 is a block diagram illustrating an exemplary embodiment of the present invention.

Figure 839:
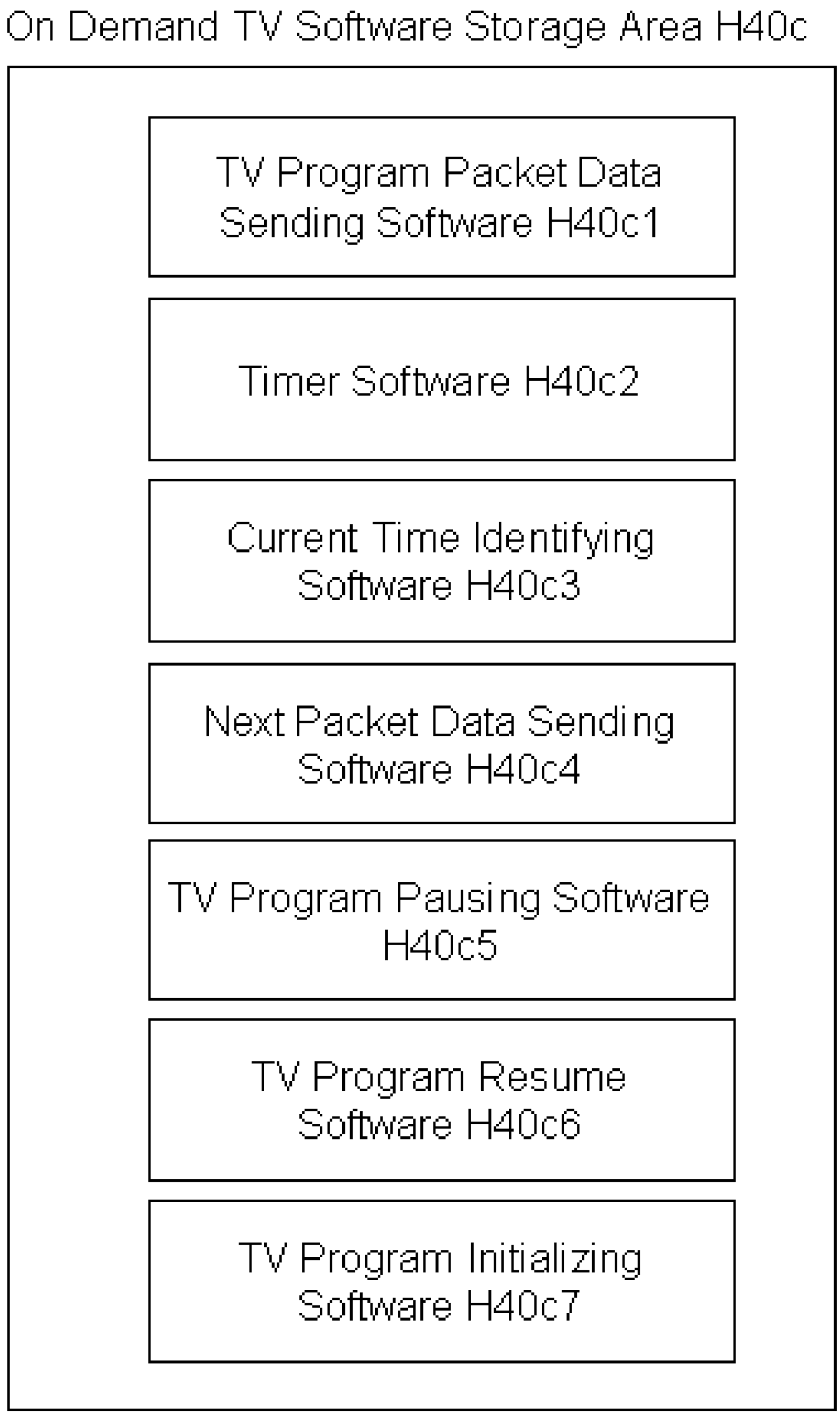

FIG. 839 is a block diagram illustrating an exemplary embodiment of the present invention.

Figure 840:
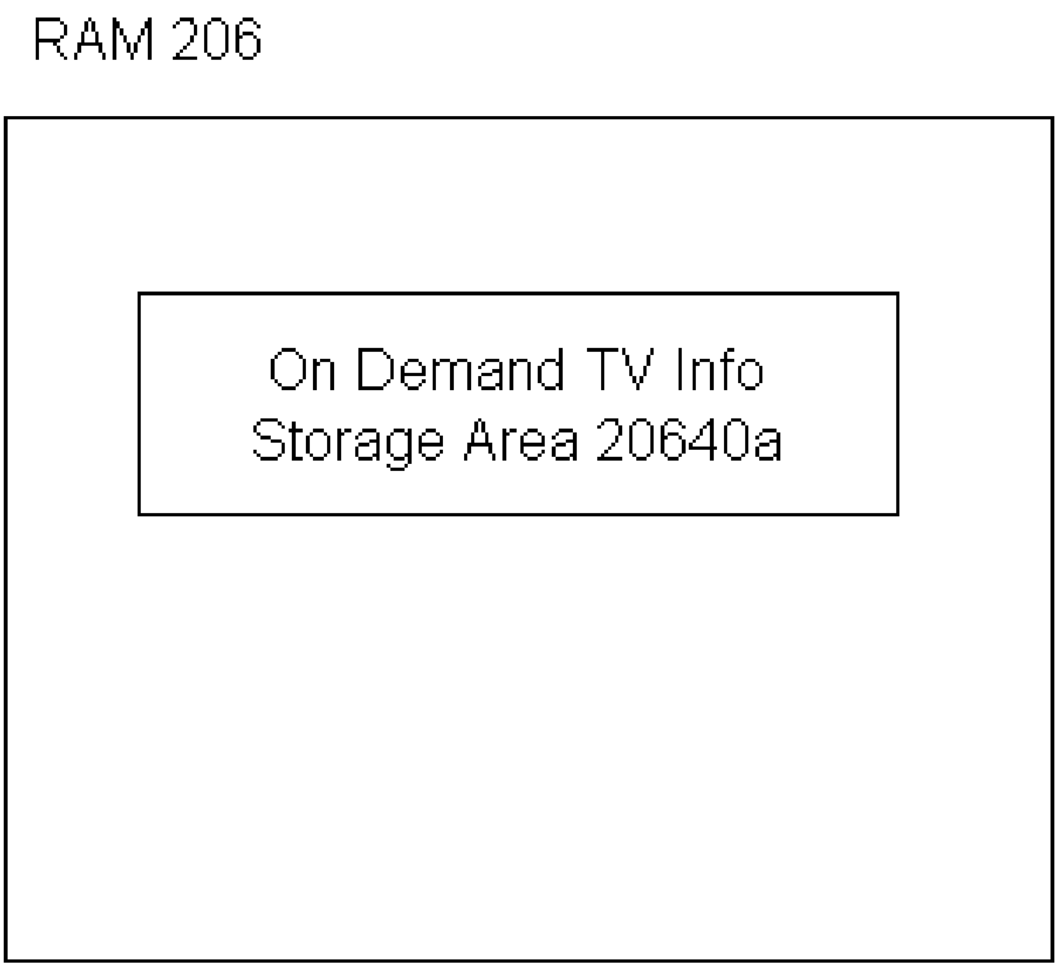

FIG. 840 is a block diagram illustrating an exemplary embodiment of the present invention.

Figure 841:
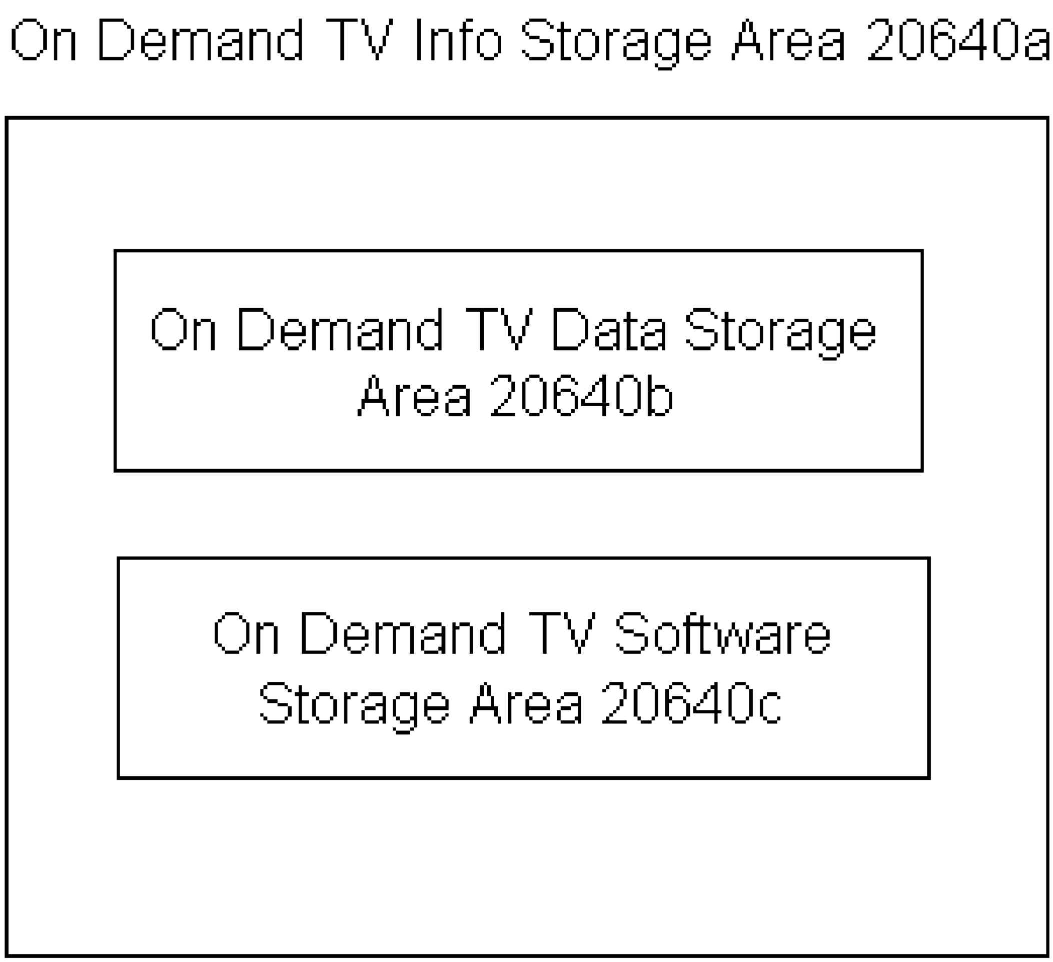

FIG. 841 is a block diagram illustrating an exemplary embodiment of the present invention.

Figure 842:
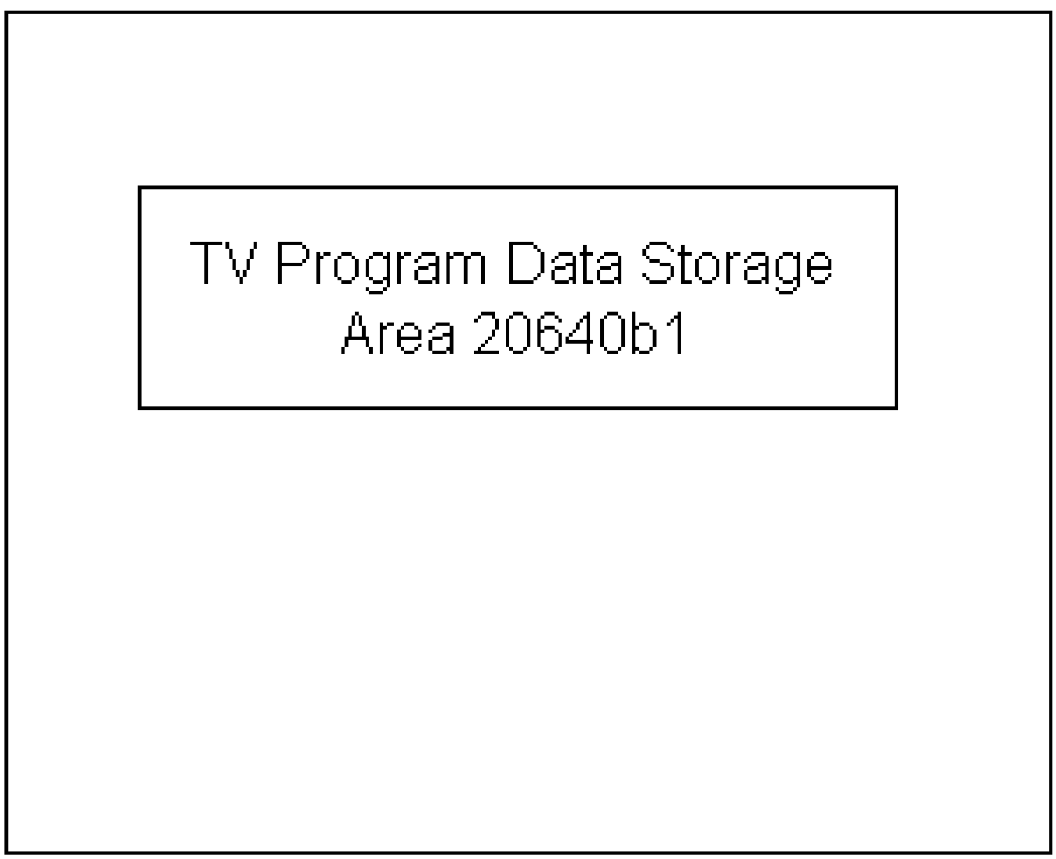

FIG. 842 is a block diagram illustrating an exemplary embodiment of the present invention.

FIG. 843 is a block diagram illustrating an exemplary embodiment of the present invention.

Figure 844:
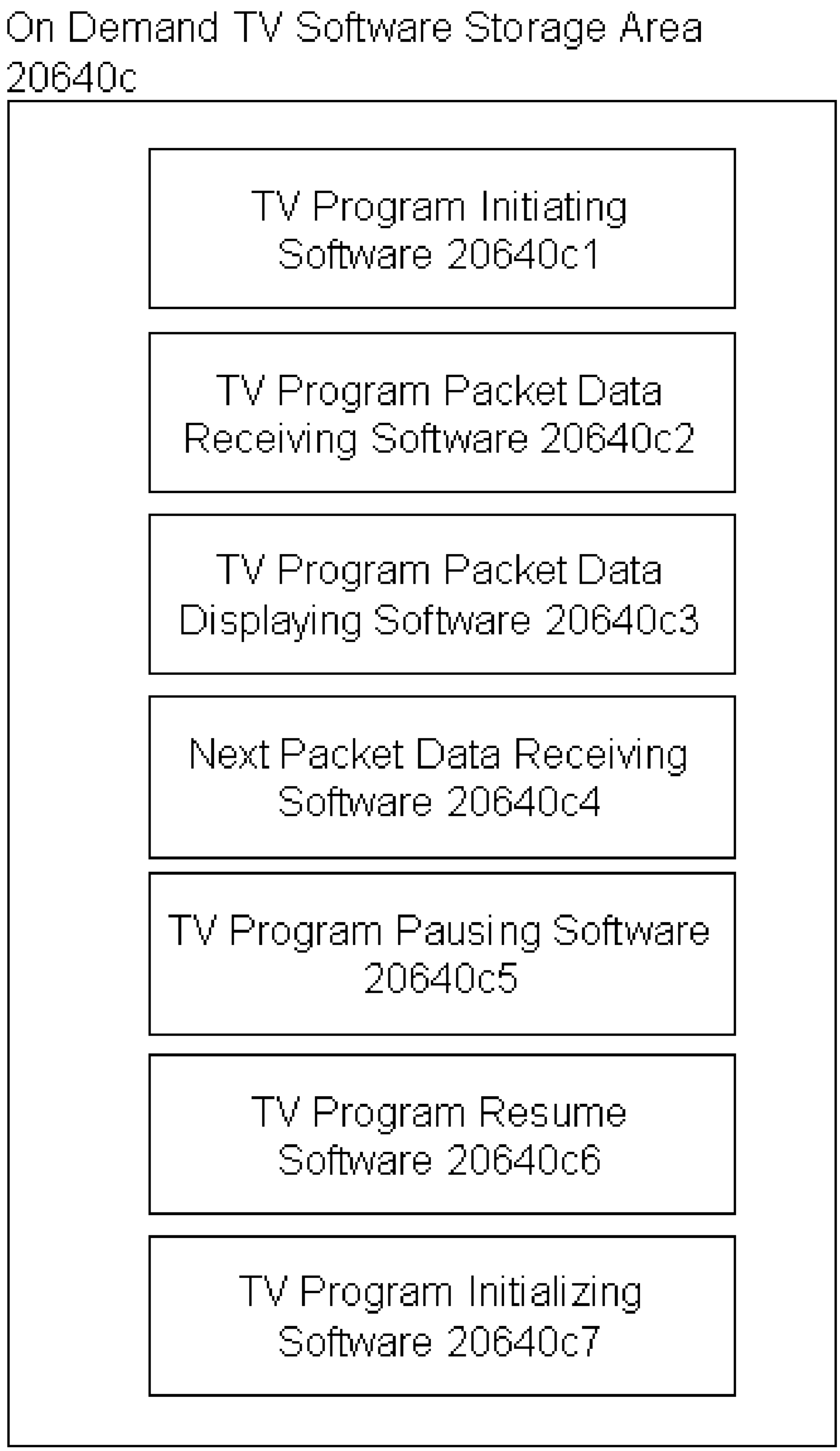

FIG. 844 is a block diagram illustrating an exemplary embodiment of the present invention.

Figure 845:
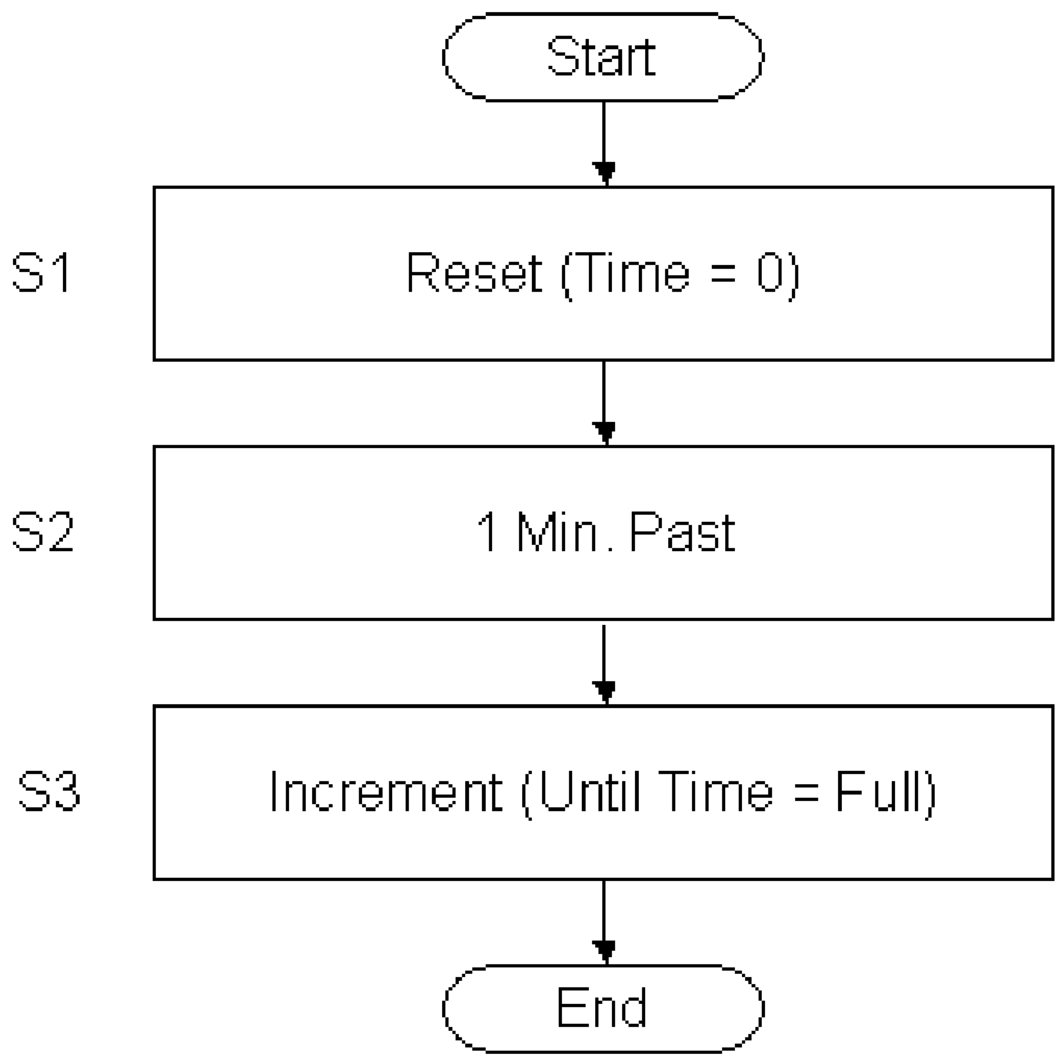

FIG. 845 is a flowchart illustrating an exemplary embodiment of the present invention.

Figure 846:
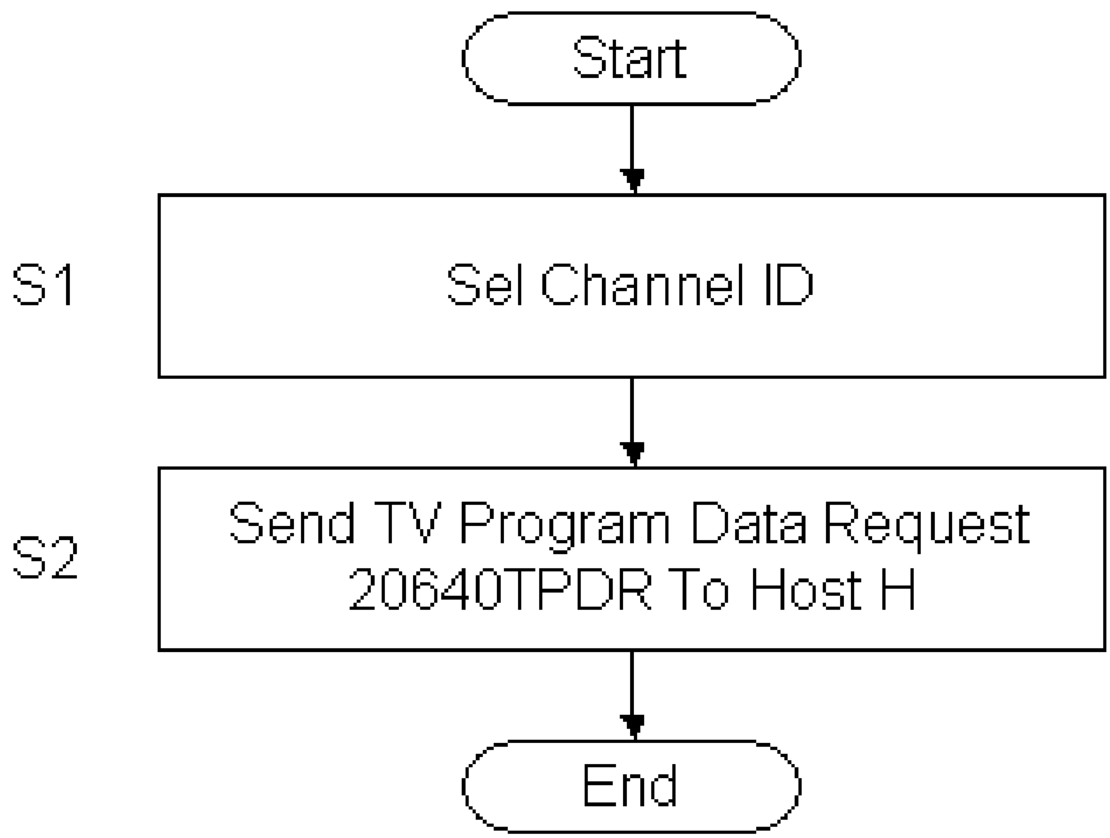

FIG. 846 is a flowchart illustrating an exemplary embodiment of the present invention.

Figure 847:
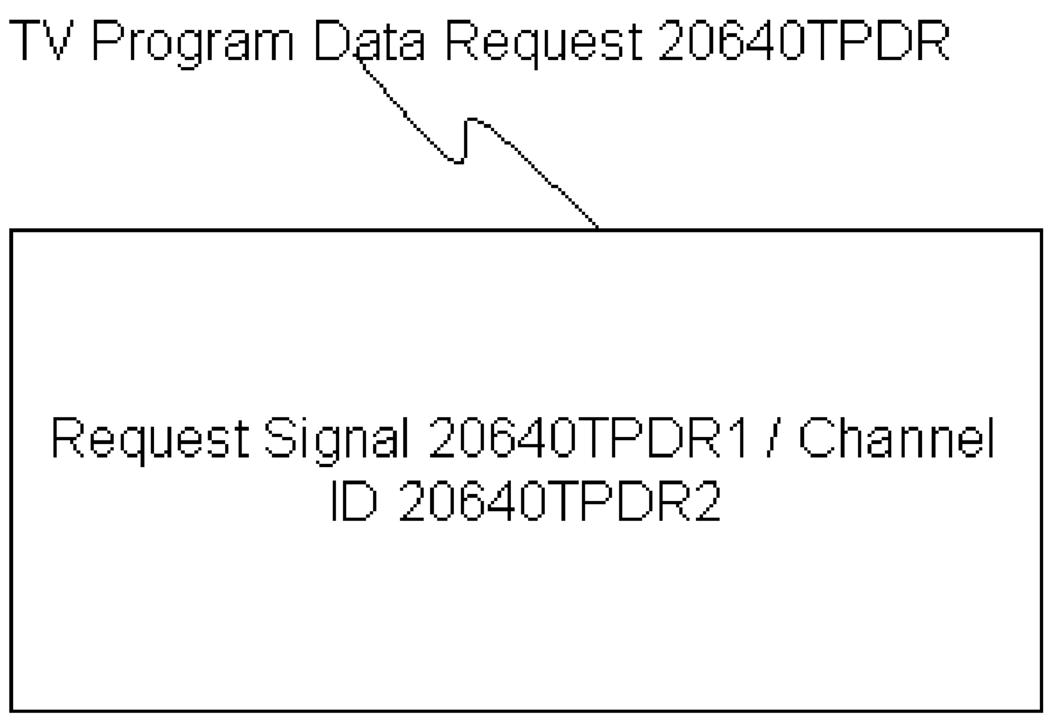

FIG. 847 is a simplified illustration of data utilized in the present invention.

Figure 848:
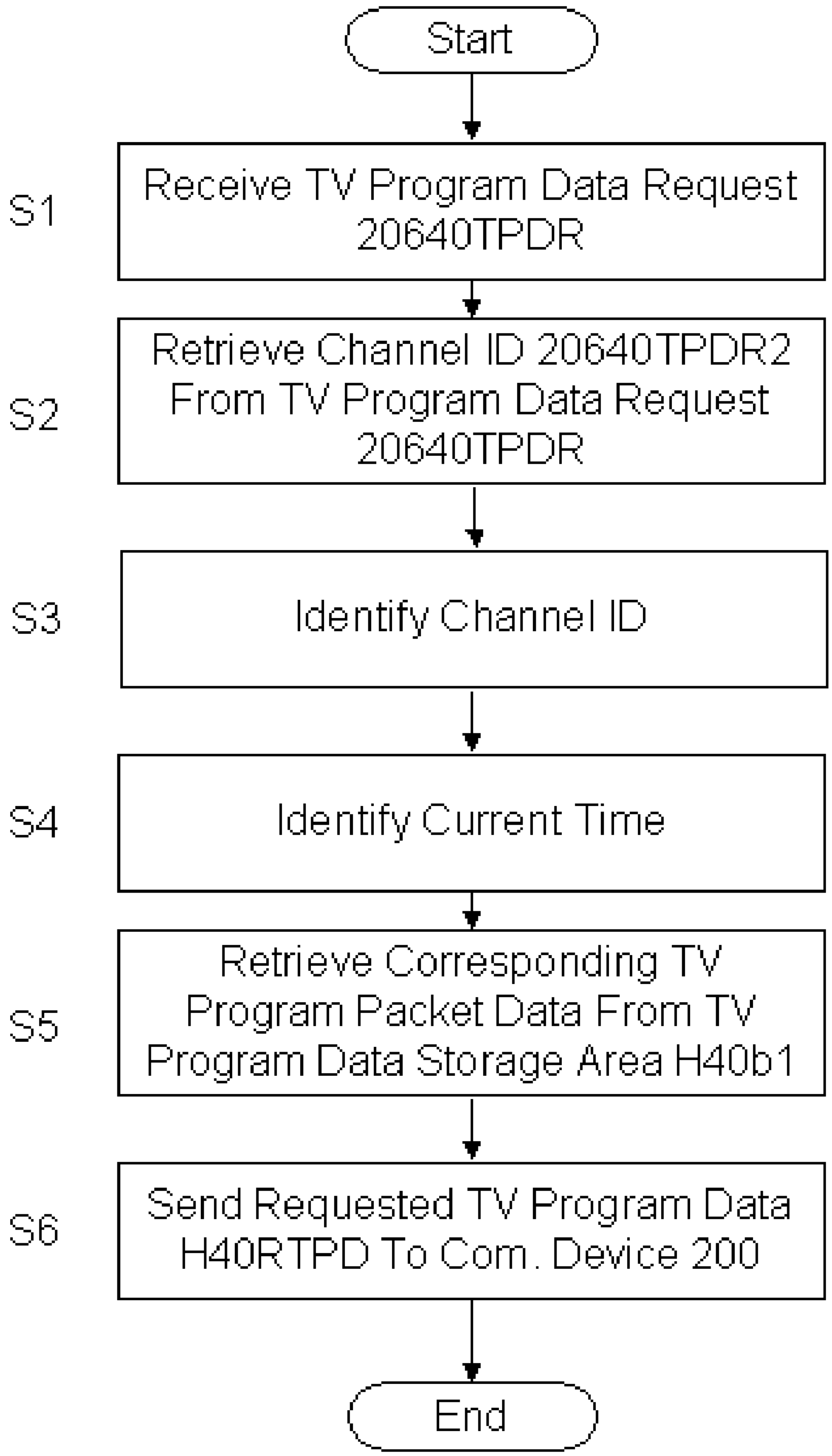

FIG. 848 is a flowchart illustrating an exemplary embodiment of the present invention.

Figure 849:
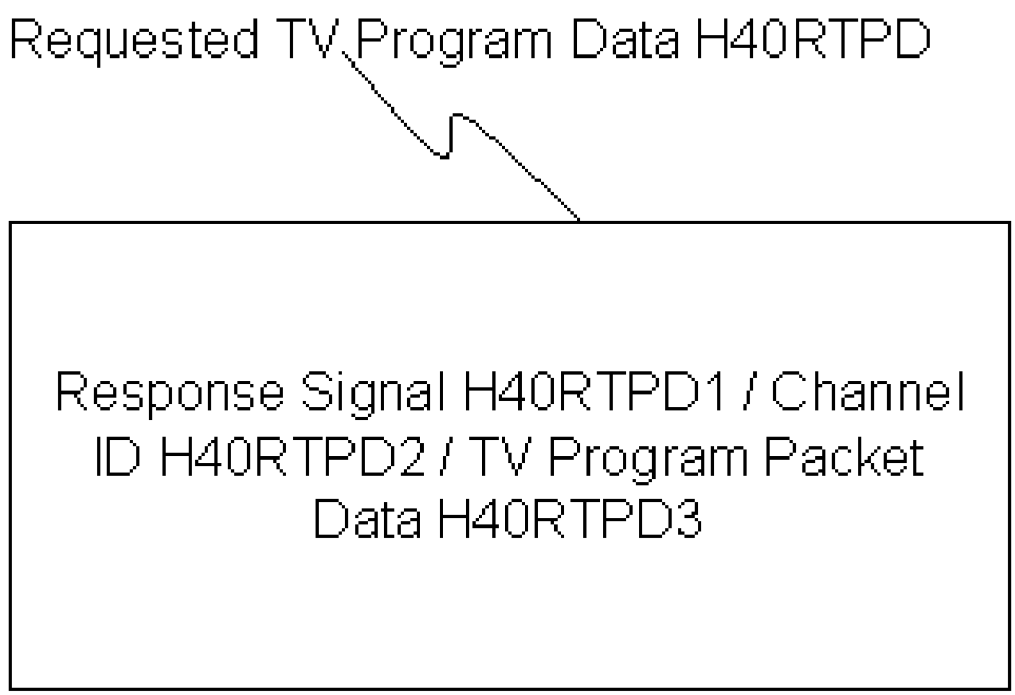

FIG. 849 is a simplified illustration of data utilized in the present invention.

Figure 850:
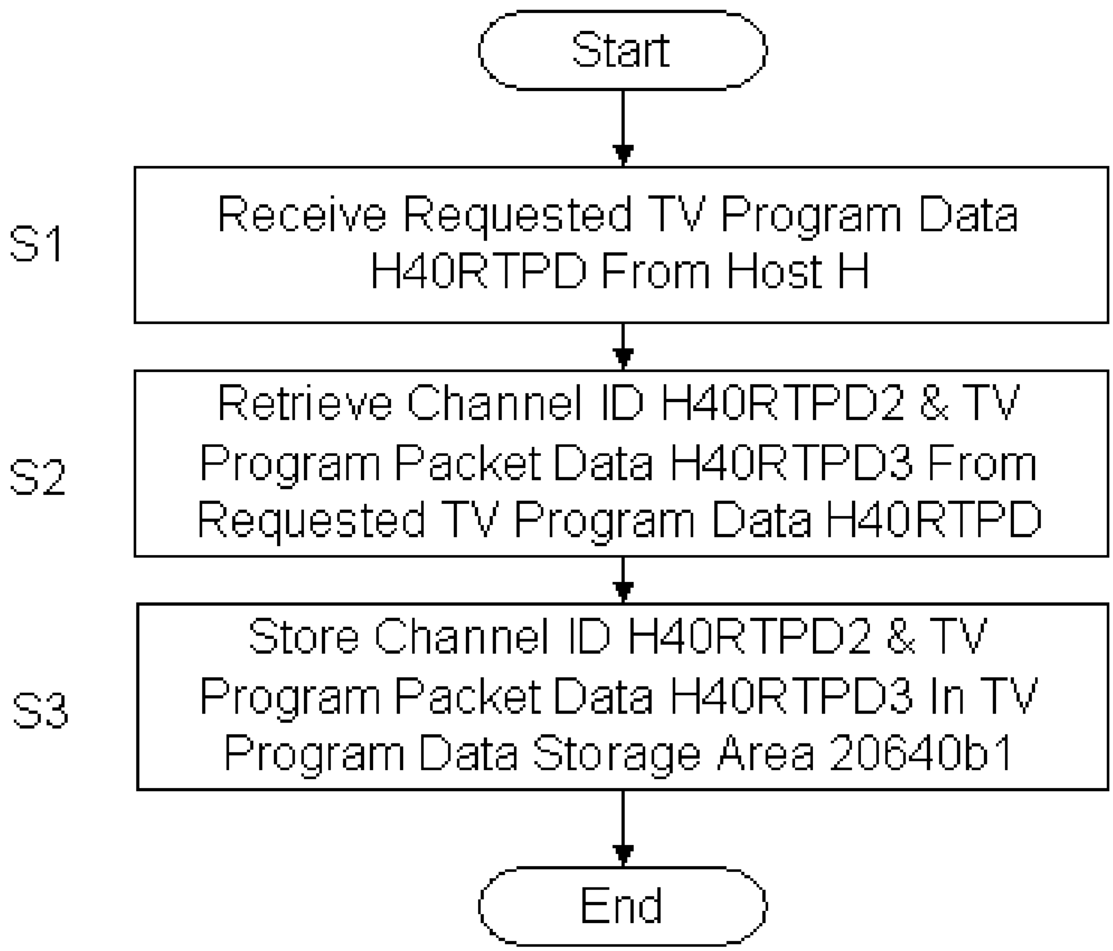

FIG. 850 is a flowchart illustrating an exemplary embodiment of the present invention.

Figure 851:
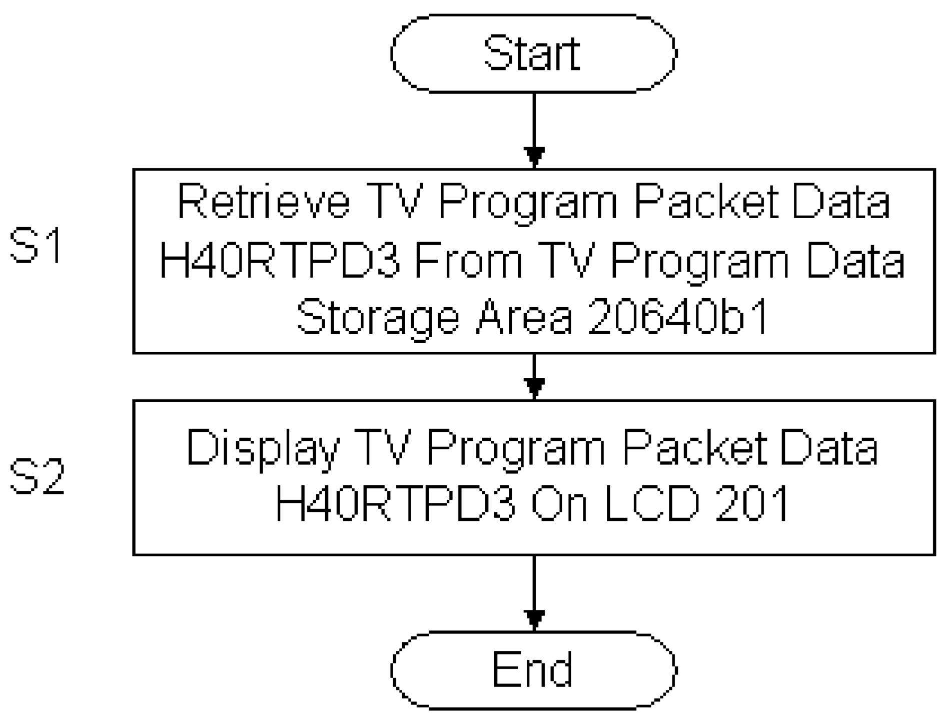

FIG. 851 is a flowchart illustrating an exemplary embodiment of the present invention.

Figure 852:
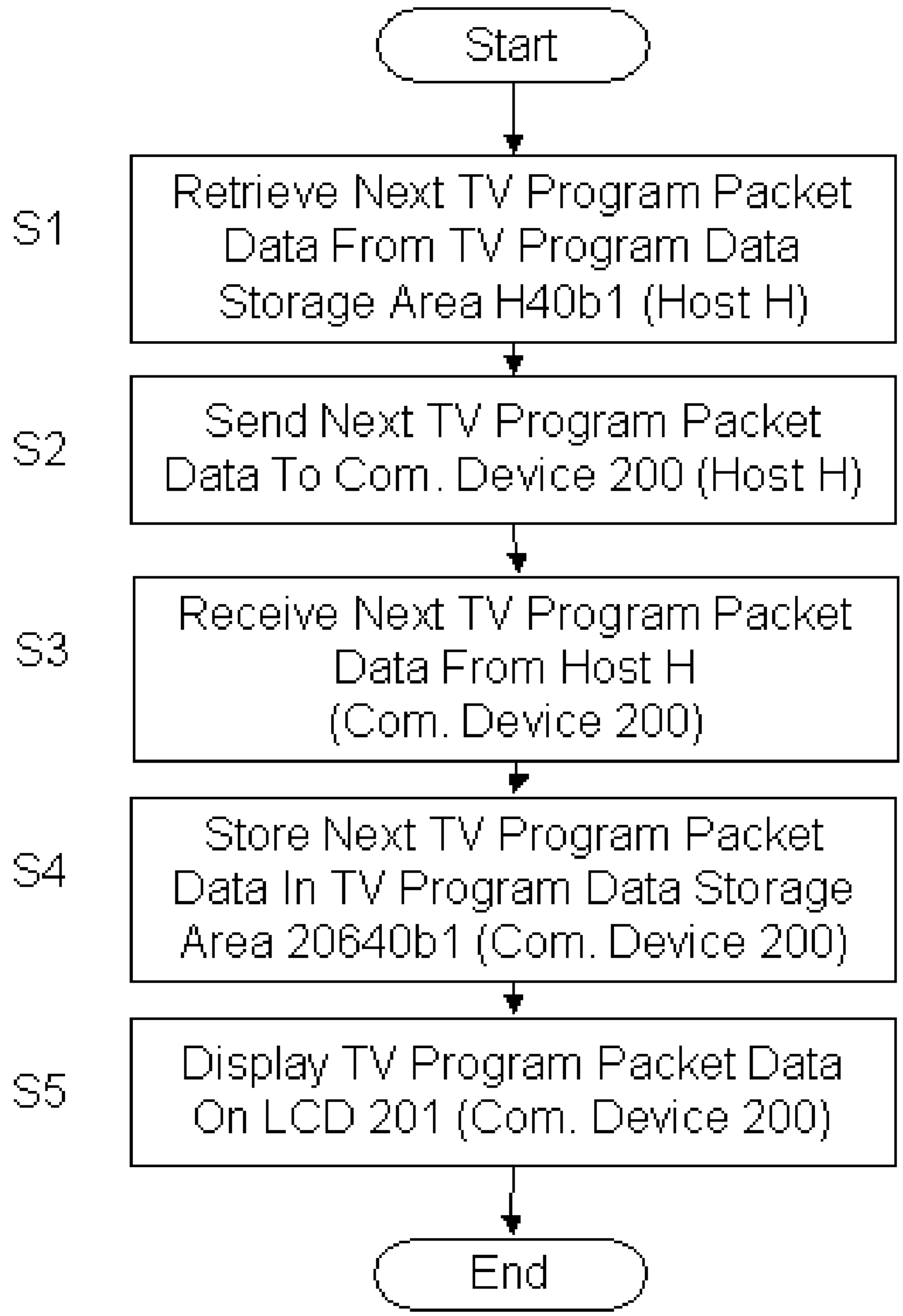

FIG. 852 is a flowchart illustrating an exemplary embodiment of the present invention.

Figure 853:
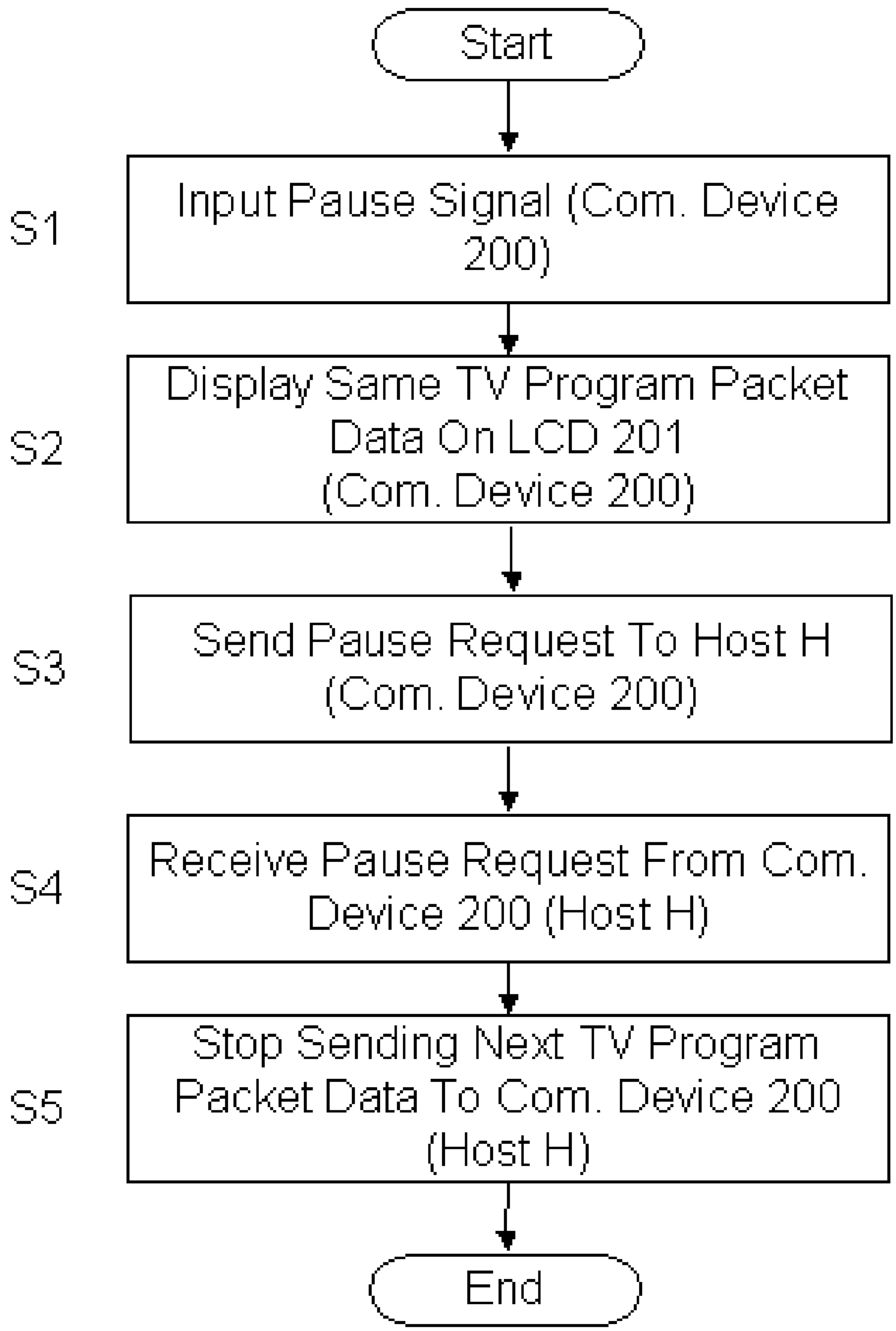

FIG. 853 is a flowchart illustrating an exemplary embodiment of the present invention.

Figure 854:
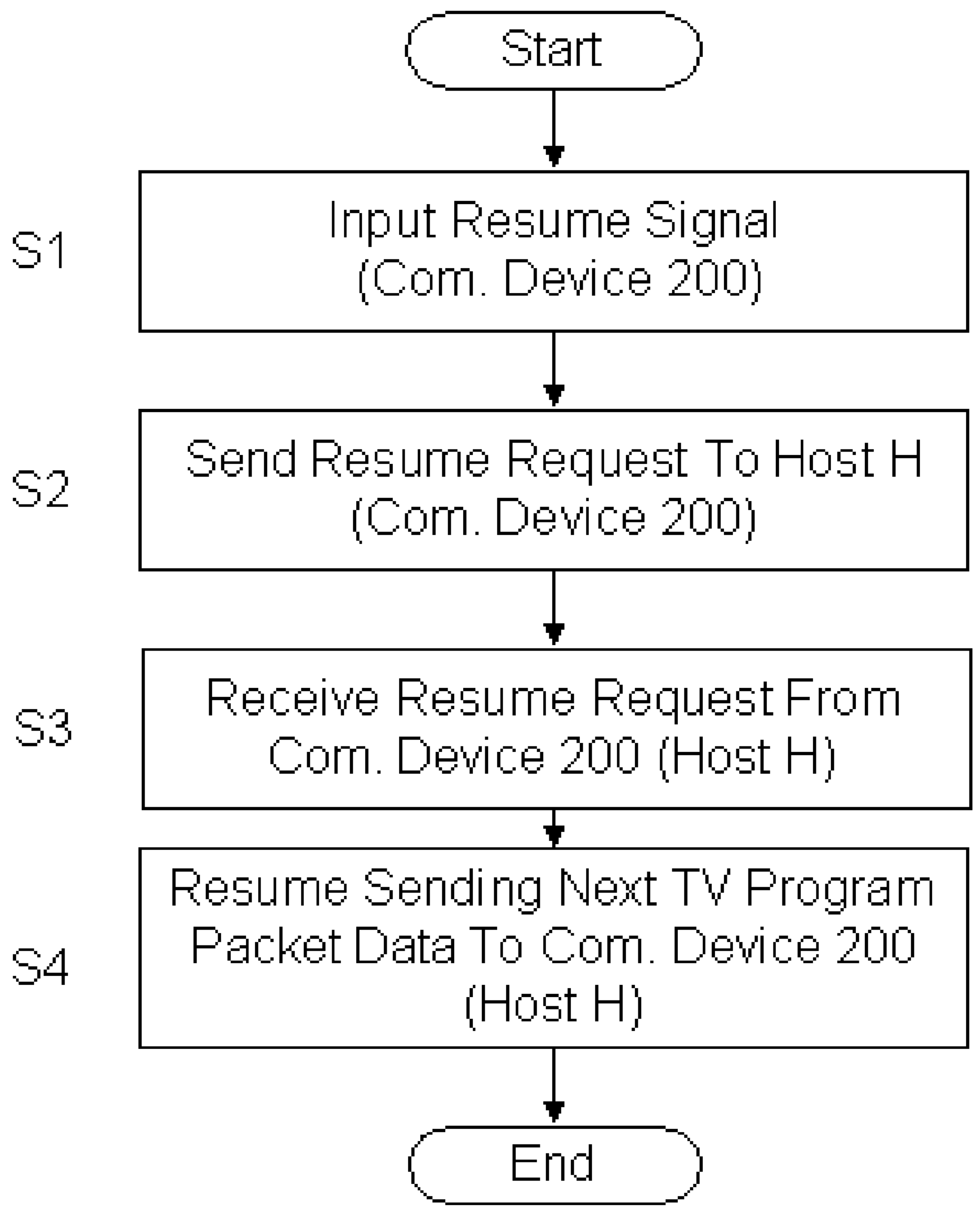

FIG. 854 is a flowchart illustrating an exemplary embodiment of the present invention.

Figure 855:
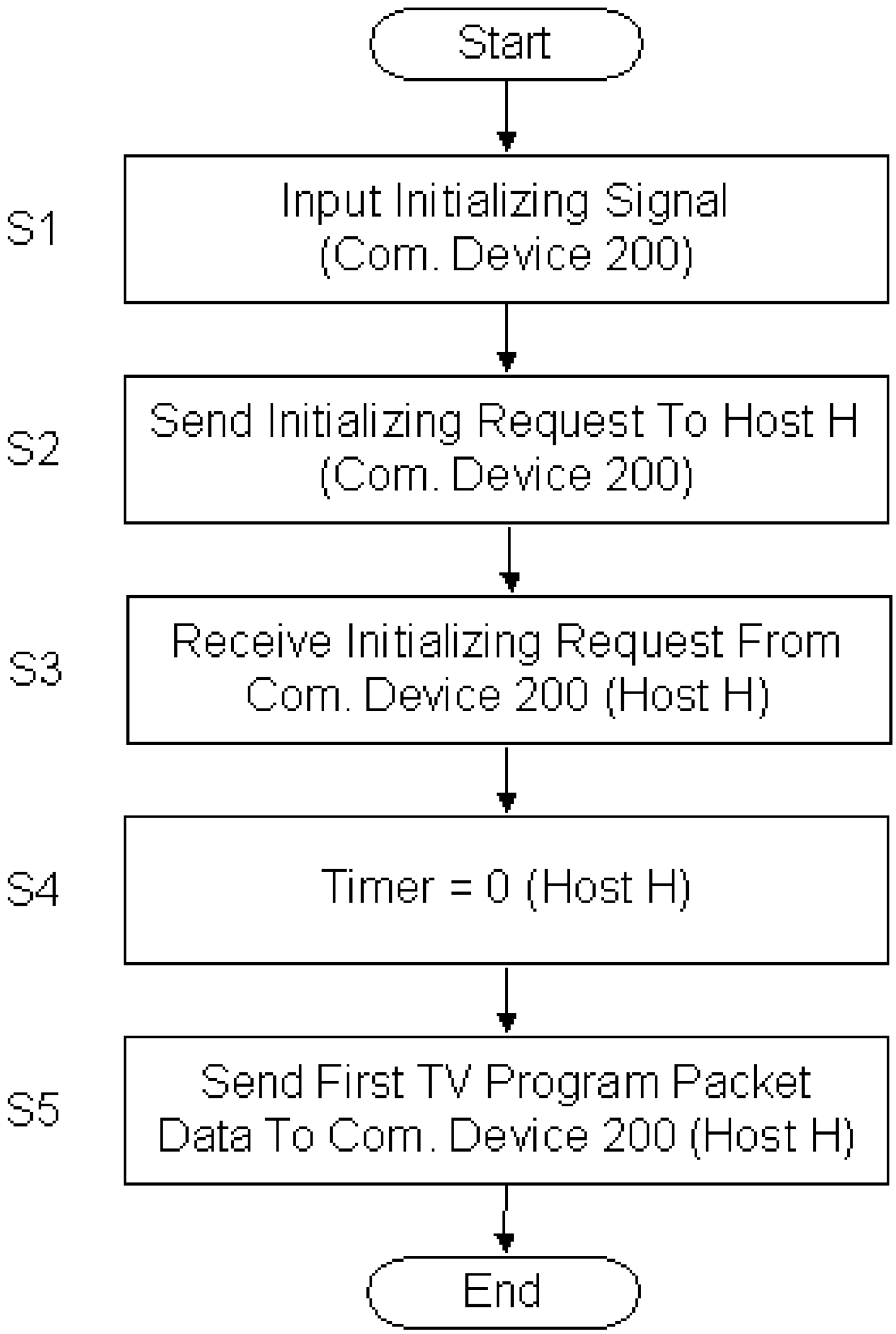

FIG. 855 is a flowchart illustrating an exemplary embodiment of the present invention.

Figure 856:
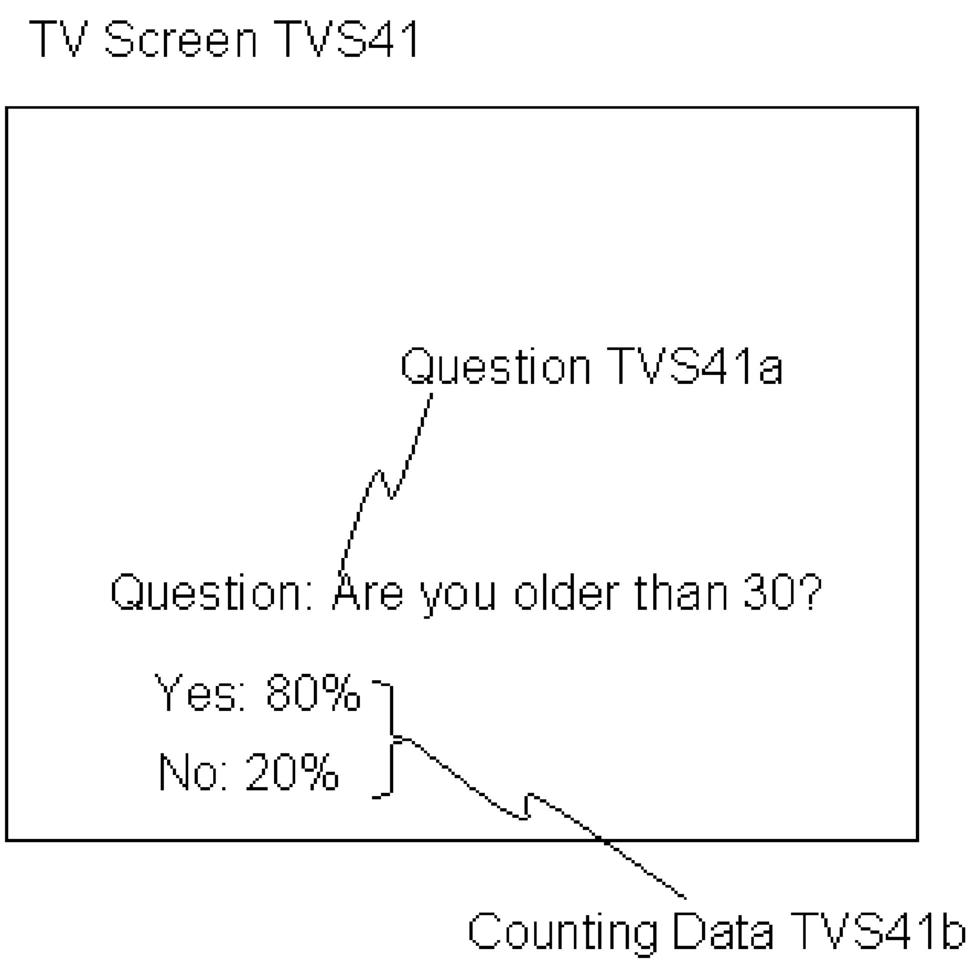

FIG. 856 is a simplified illustration illustrating an exemplary embodiment of the present invention.

Figure 857:
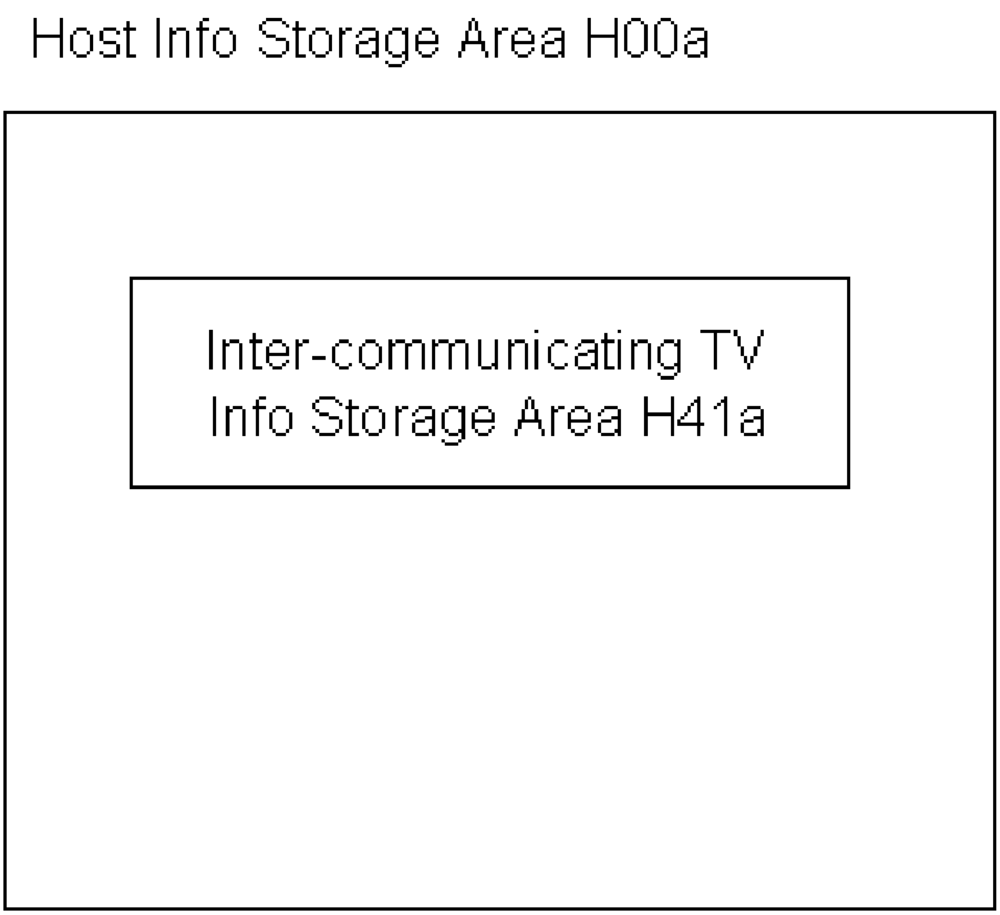

FIG. 857 is a block diagram illustrating an exemplary embodiment of the present invention.

Figure 858:
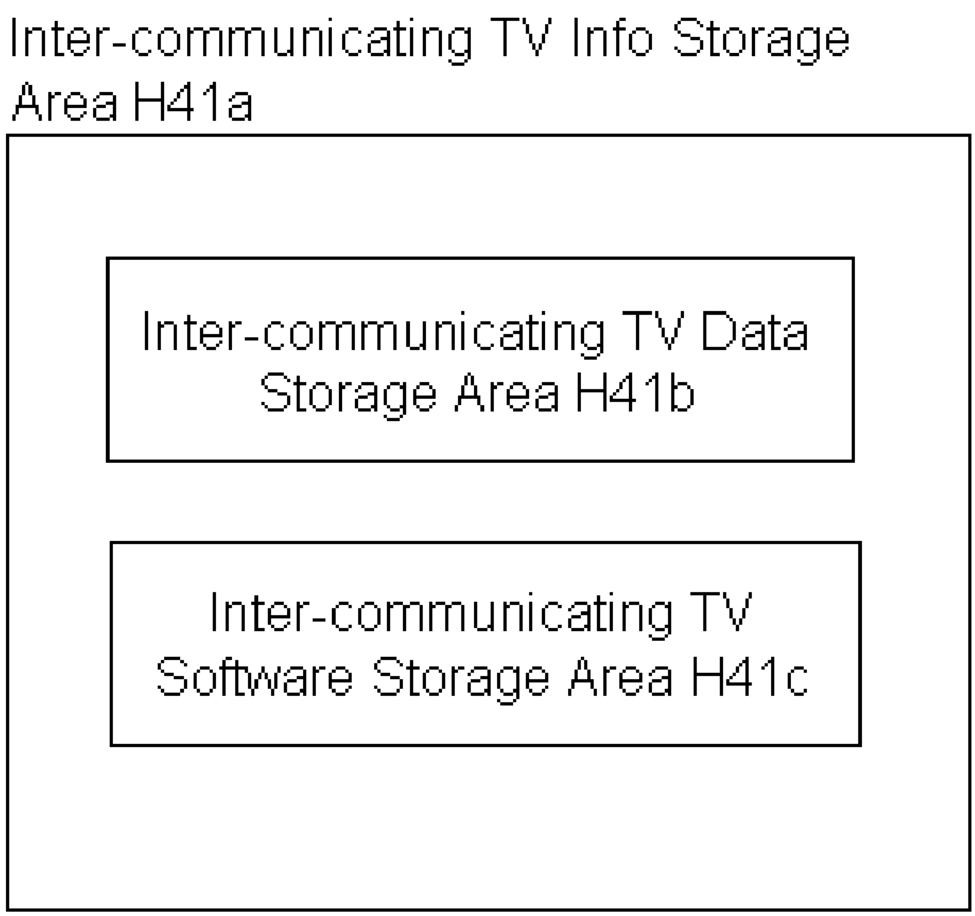

FIG. 858 is a block diagram illustrating an exemplary embodiment of the present invention.

Figure 859:
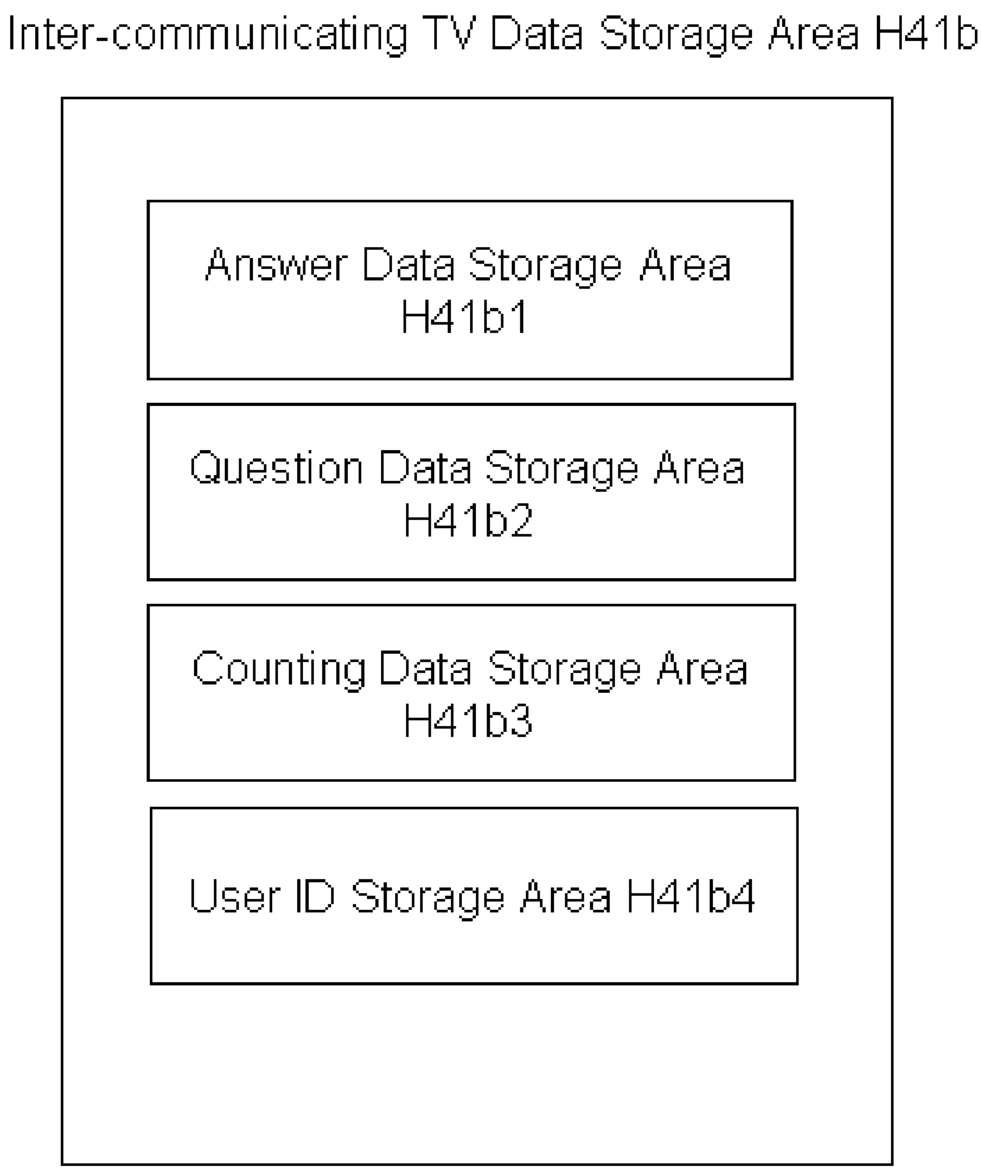

FIG. 859 is a block diagram illustrating an exemplary embodiment of the present invention.

FIG. 859*a* is a block diagram illustrating an exemplary embodiment of the present invention.

FIG. 860 is a block diagram illustrating an exemplary embodiment of the present invention.

FIG. 861 is a block diagram illustrating an exemplary embodiment of the present invention.

FIG. 862 is a block diagram illustrating an exemplary embodiment of the present invention.

Figure 863:
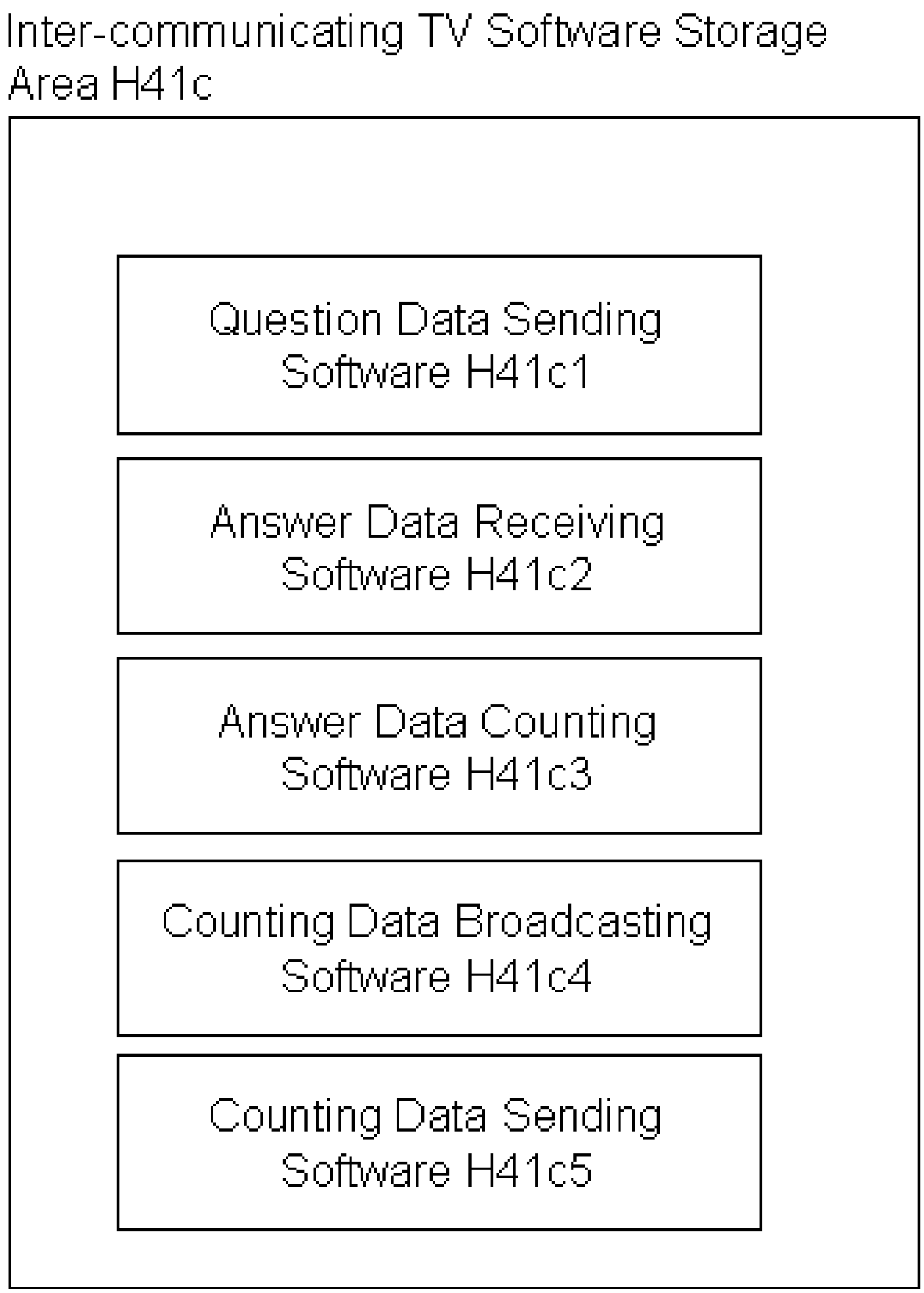

FIG. 863 is a block diagram illustrating an exemplary embodiment of the present invention.

Figure 864:
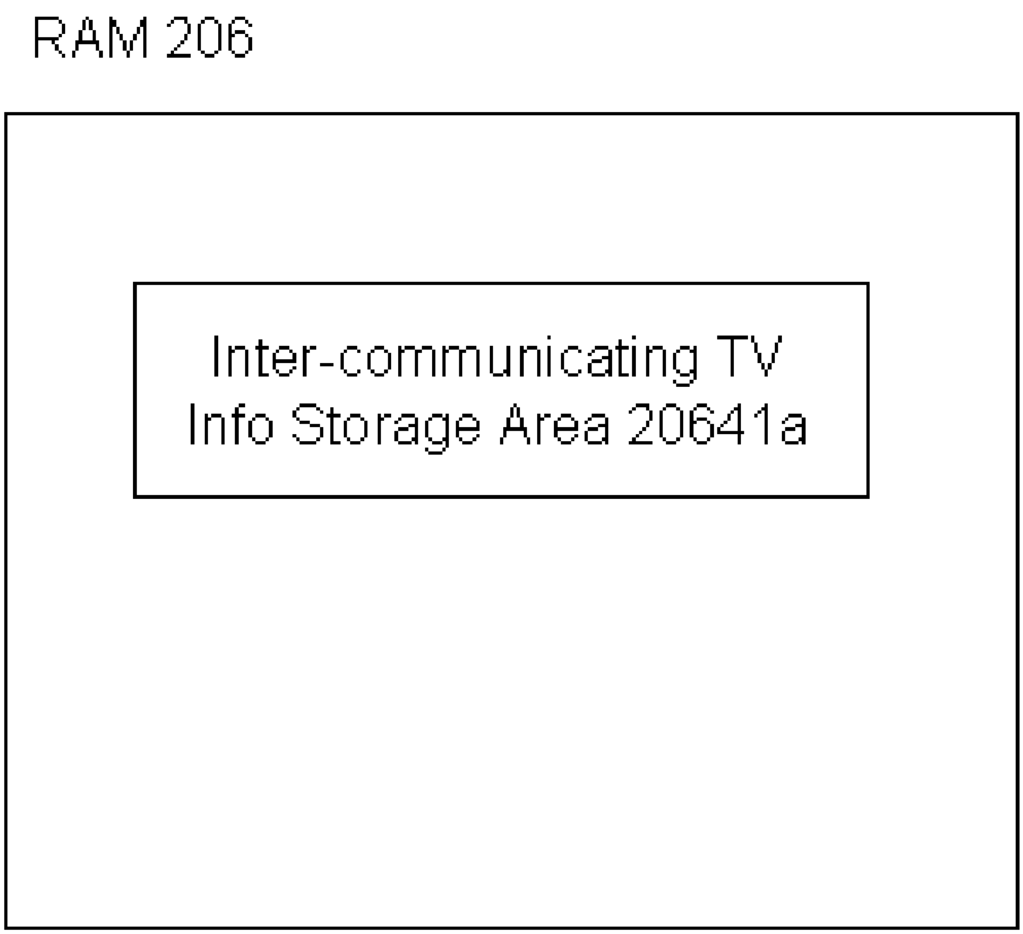

FIG. 864 is a block diagram illustrating an exemplary embodiment of the present invention.

Figure 865:
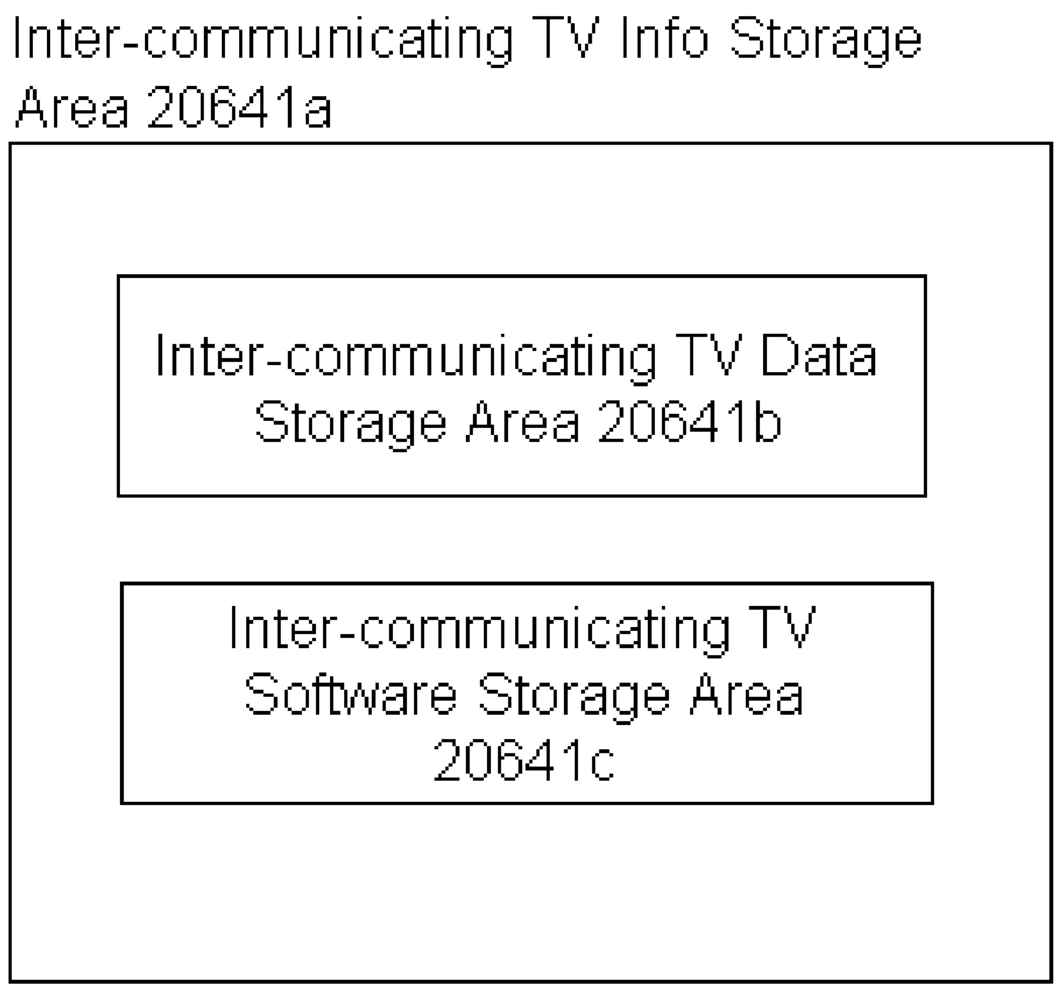

FIG. 865 is a block diagram illustrating an exemplary embodiment of the present invention.

Figure 866:
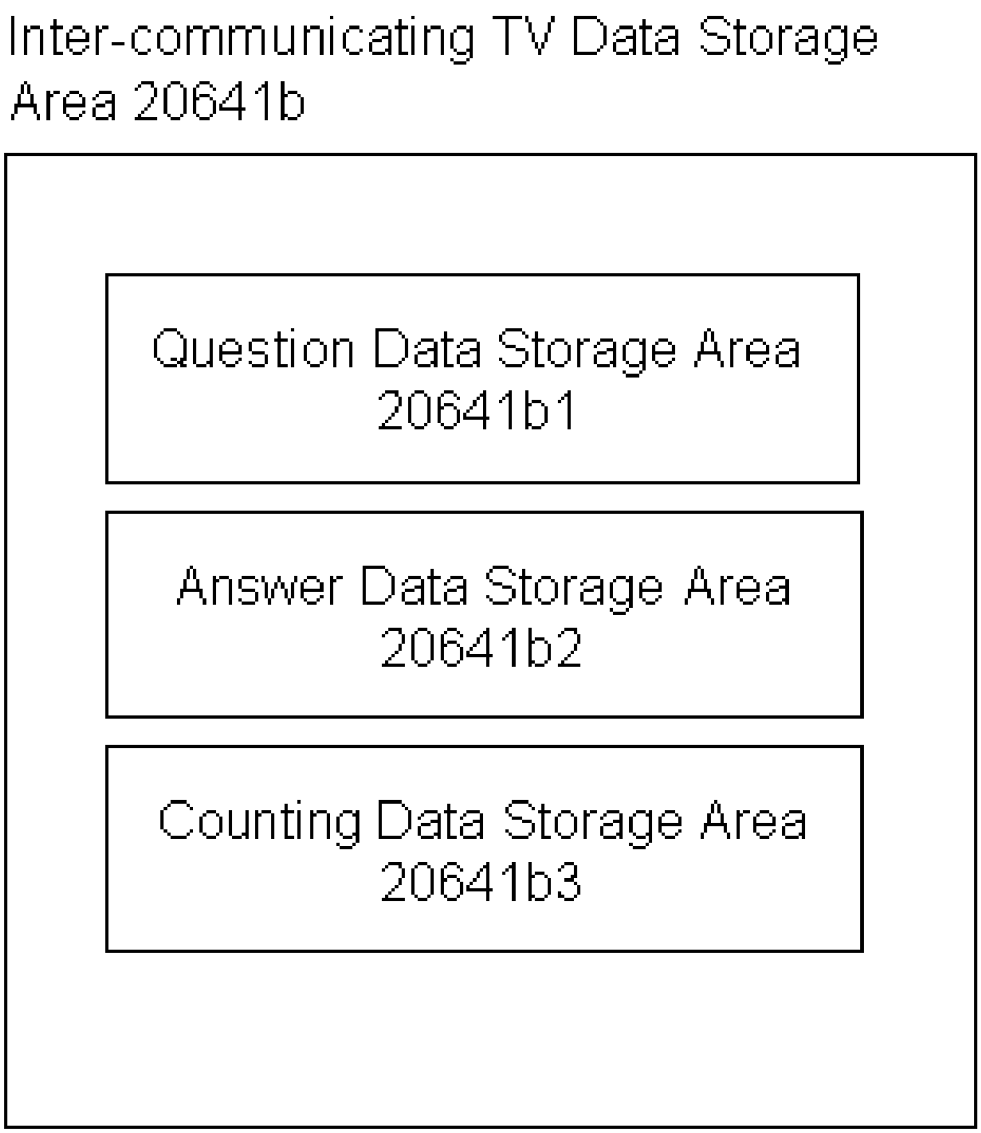

FIG. 866 is a block diagram illustrating an exemplary embodiment of the present invention.

FIG. 867 is a block diagram illustrating an exemplary embodiment of the present invention.

FIG. 868 is a block diagram illustrating an exemplary embodiment of the present invention.

FIG. 869 is a block diagram illustrating an exemplary embodiment of the present invention.

Figure 870:
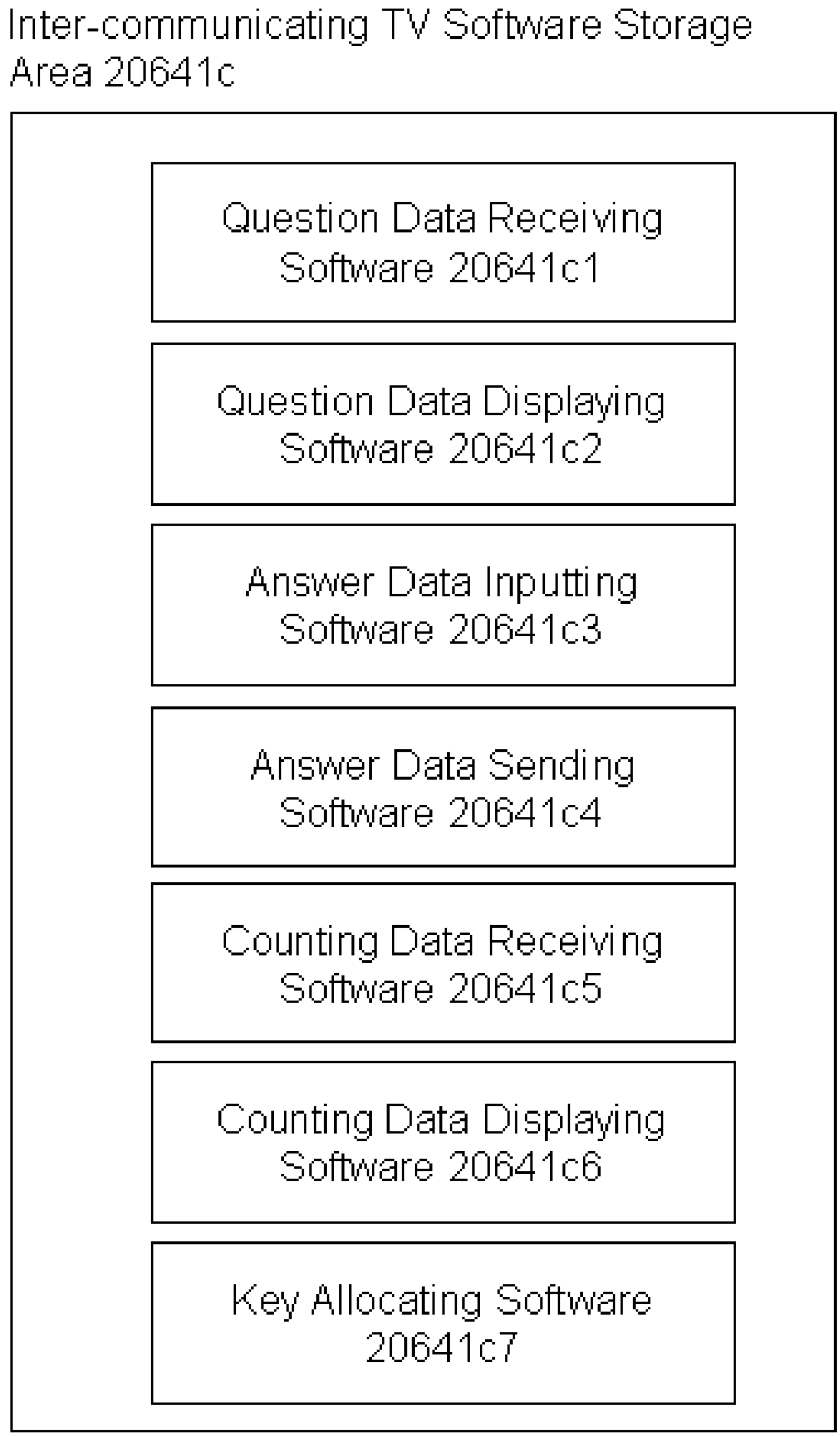

FIG. 870 is a block diagram illustrating an exemplary embodiment of the present invention.

Figure 871:
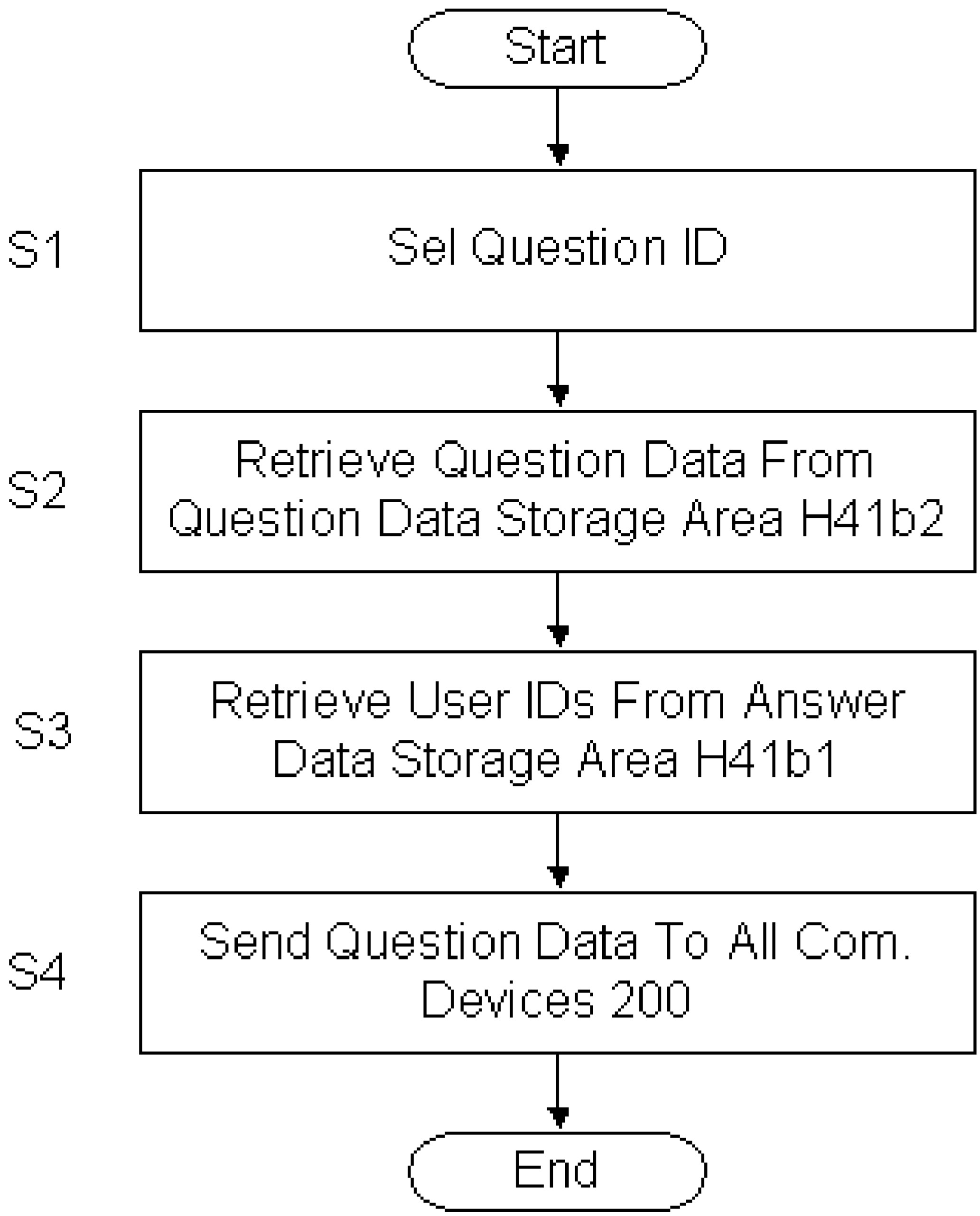

FIG. 871 is a flowchart illustrating an exemplary embodiment of the present invention.

Figure 872:
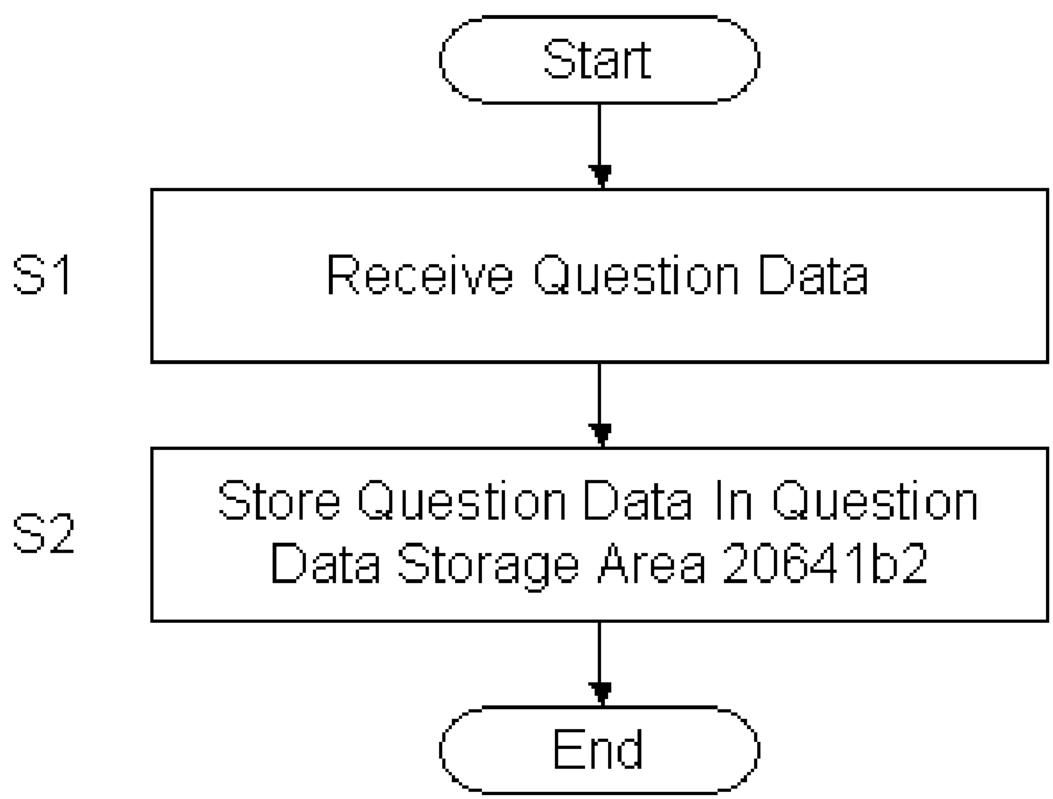

FIG. 872 is a flowchart illustrating an exemplary embodiment of the present invention.

Figure 873:
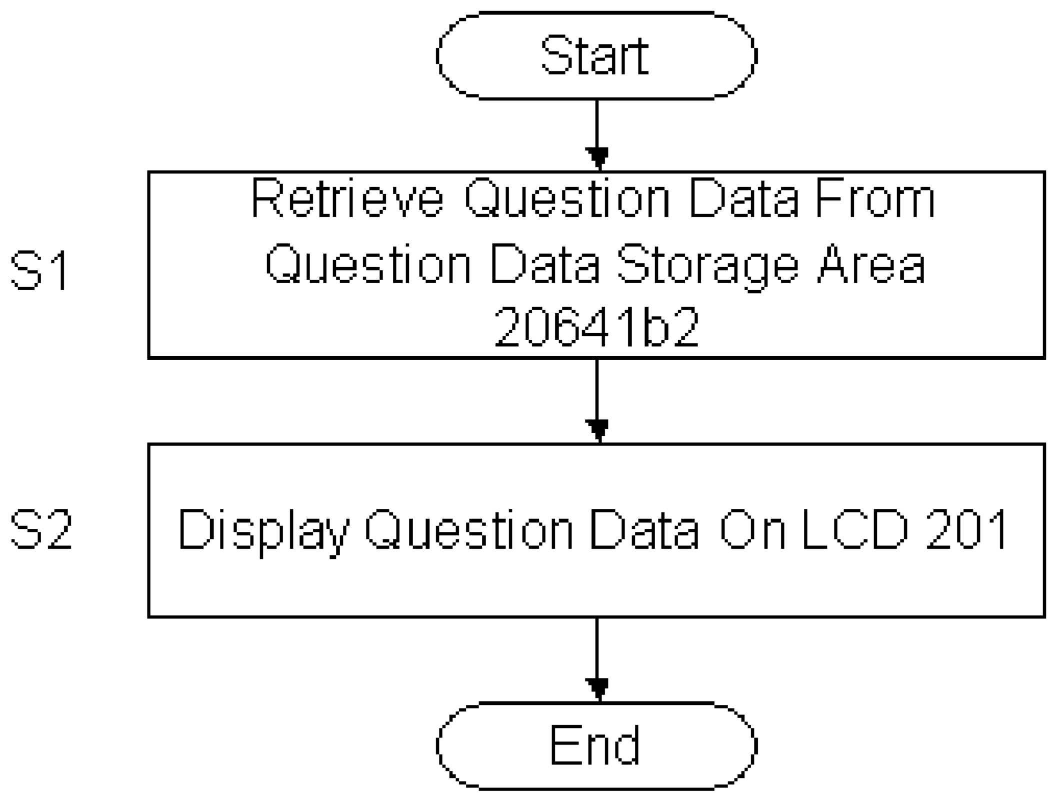

FIG. 873 is a flowchart illustrating an exemplary embodiment of the present invention.

Figure 874:
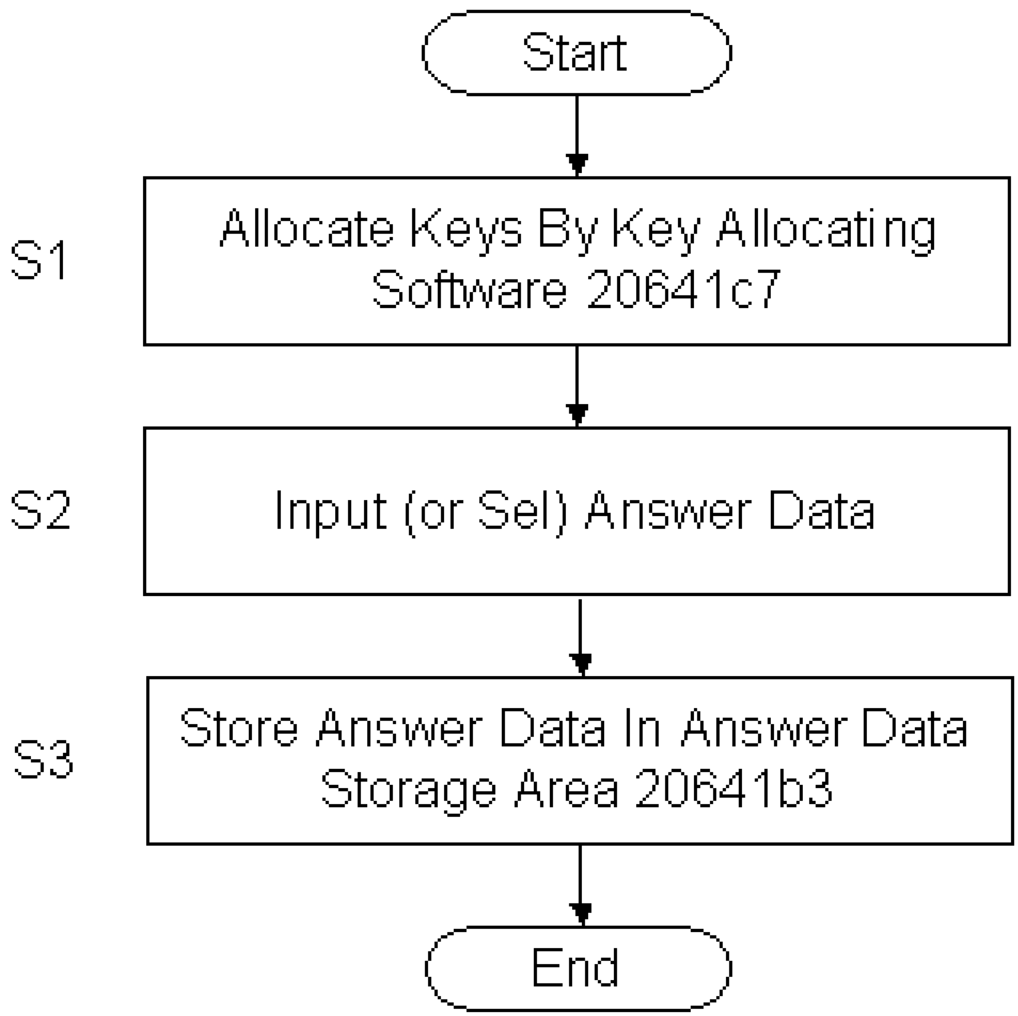

FIG. 874 is a flowchart illustrating an exemplary embodiment of the present invention.

Figure 875:
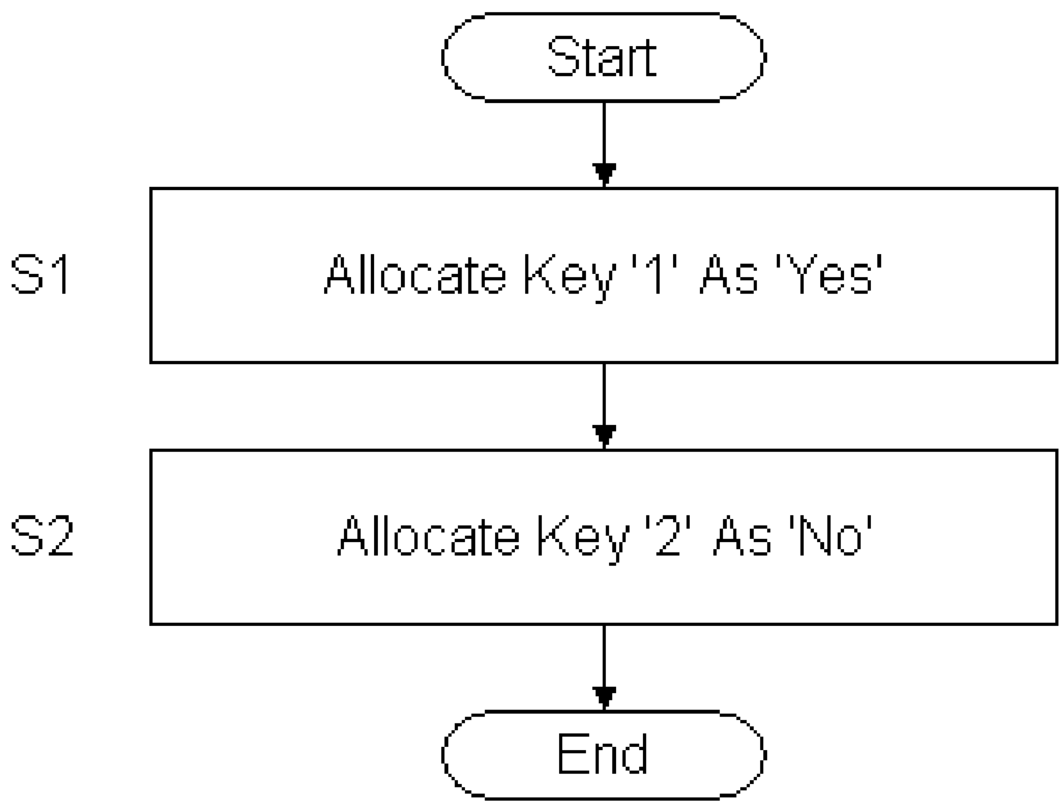

FIG. 875 is a flowchart illustrating an exemplary embodiment of the present invention.

Figure 876:
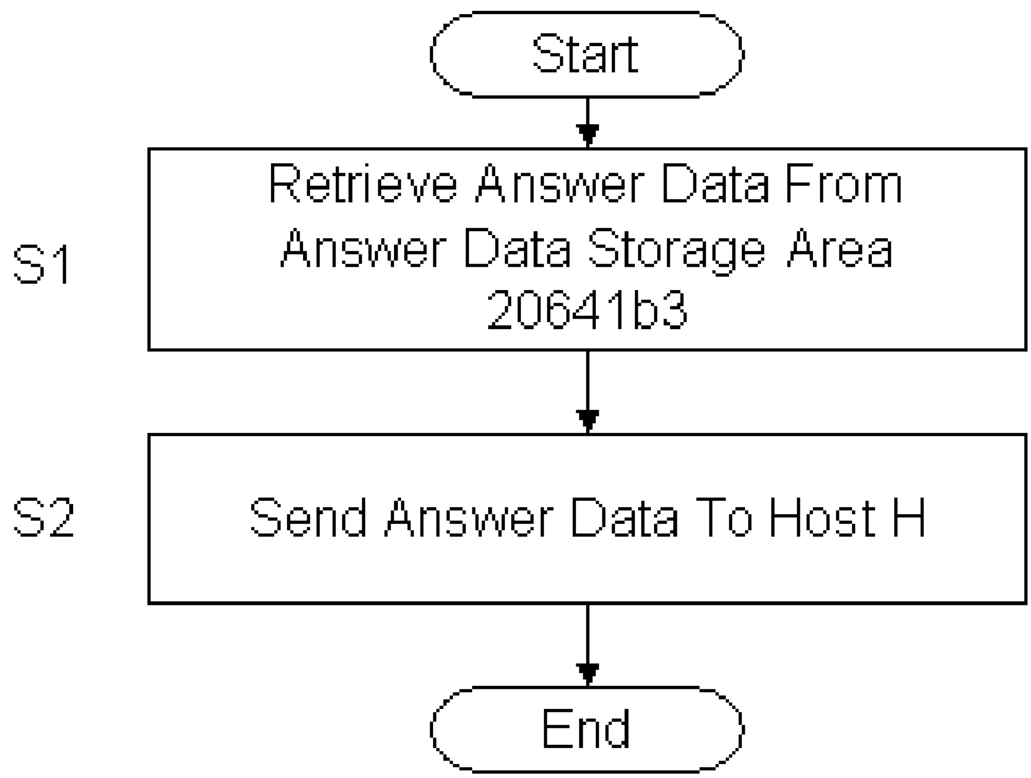

FIG. 876 is a flowchart illustrating an exemplary embodiment of the present invention.

Figure 877:
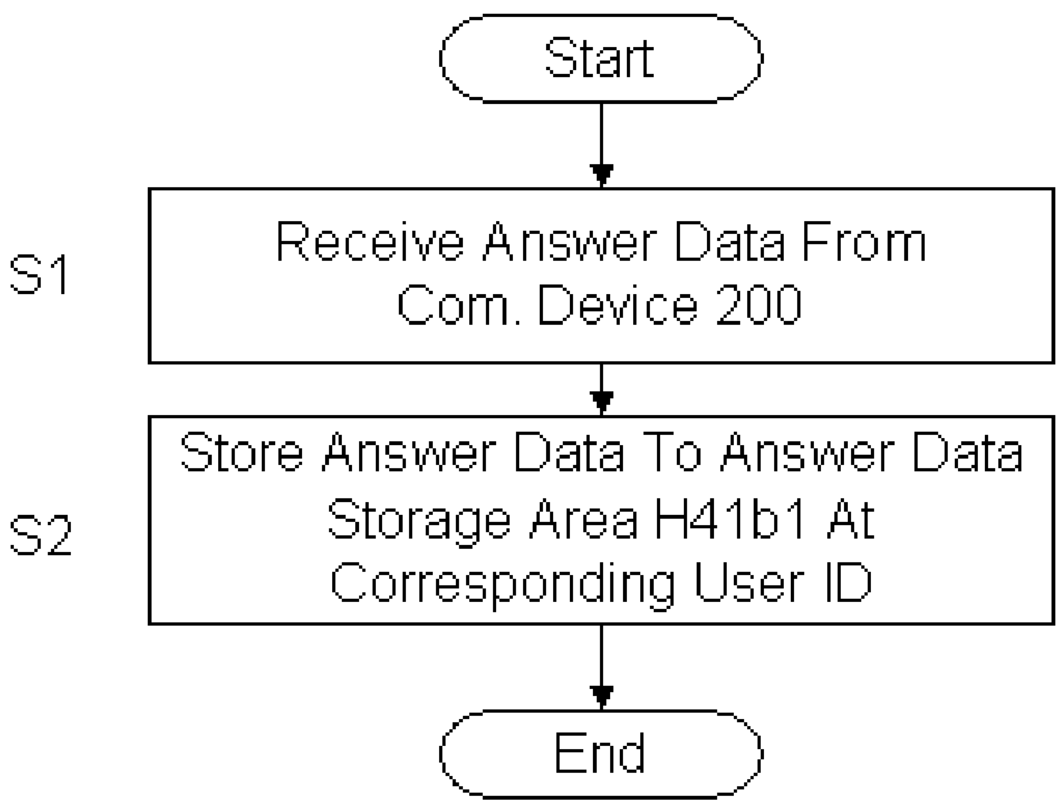

FIG. 877 is a flowchart illustrating an exemplary embodiment of the present invention.

Figure 878:
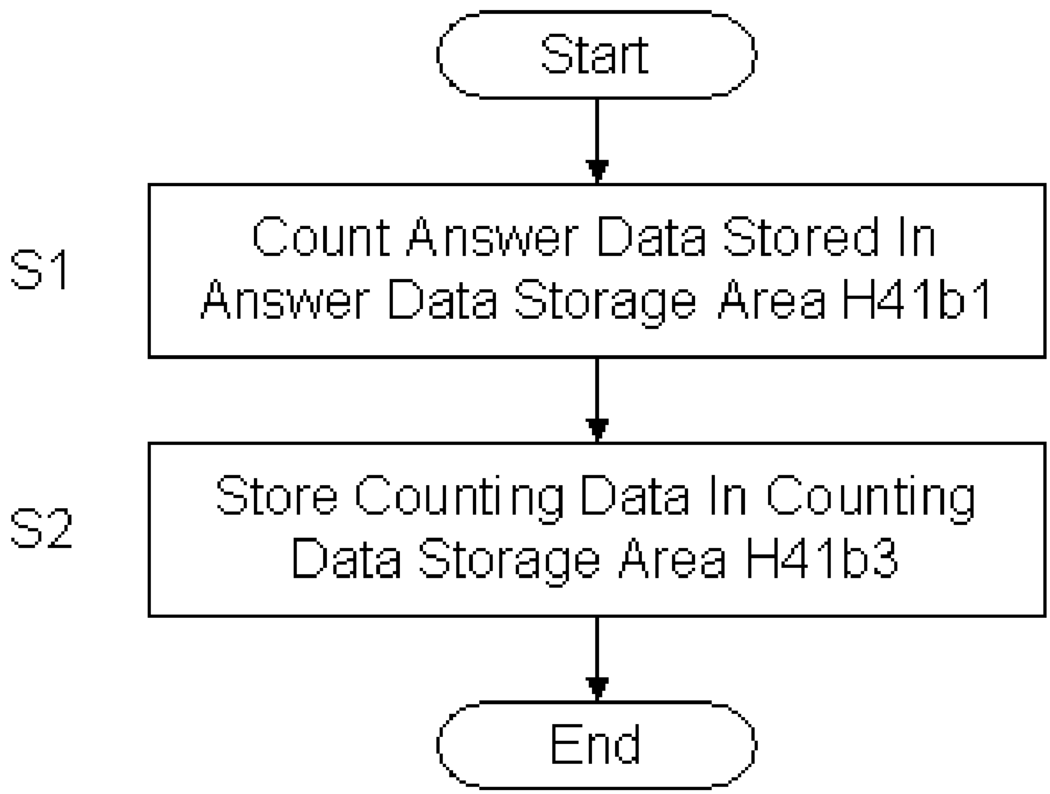

FIG. 878 is a flowchart illustrating an exemplary embodiment of the present invention.

Figure 879:
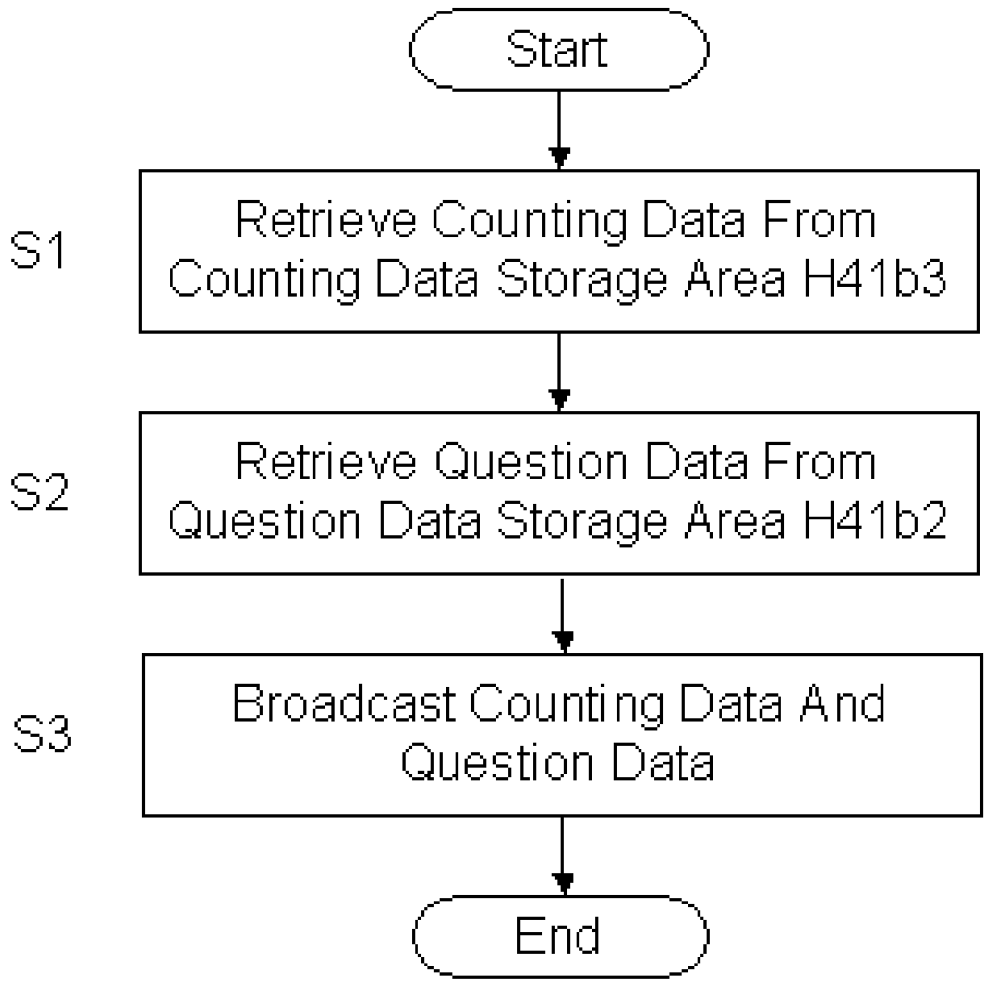

FIG. 879 is a flowchart illustrating an exemplary embodiment of the present invention.

Figure 880:
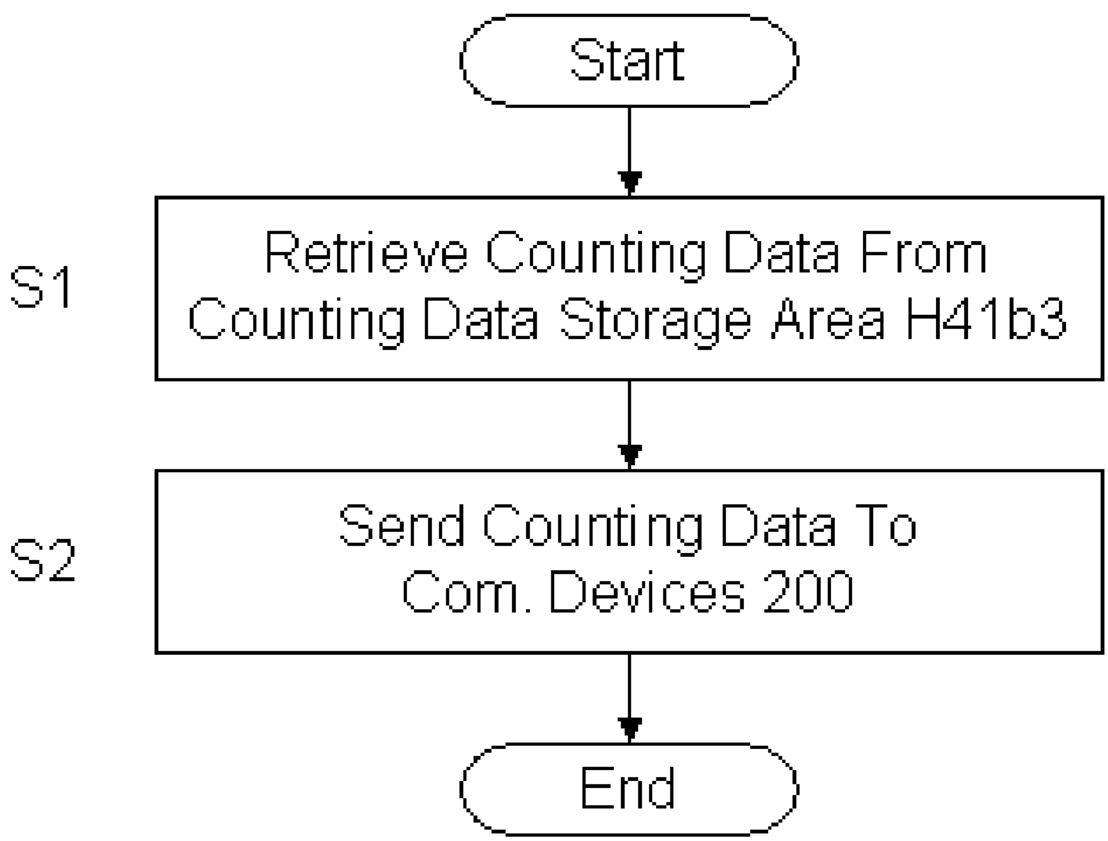

FIG. 880 is a flowchart illustrating an exemplary embodiment of the present invention.

Figure 881:
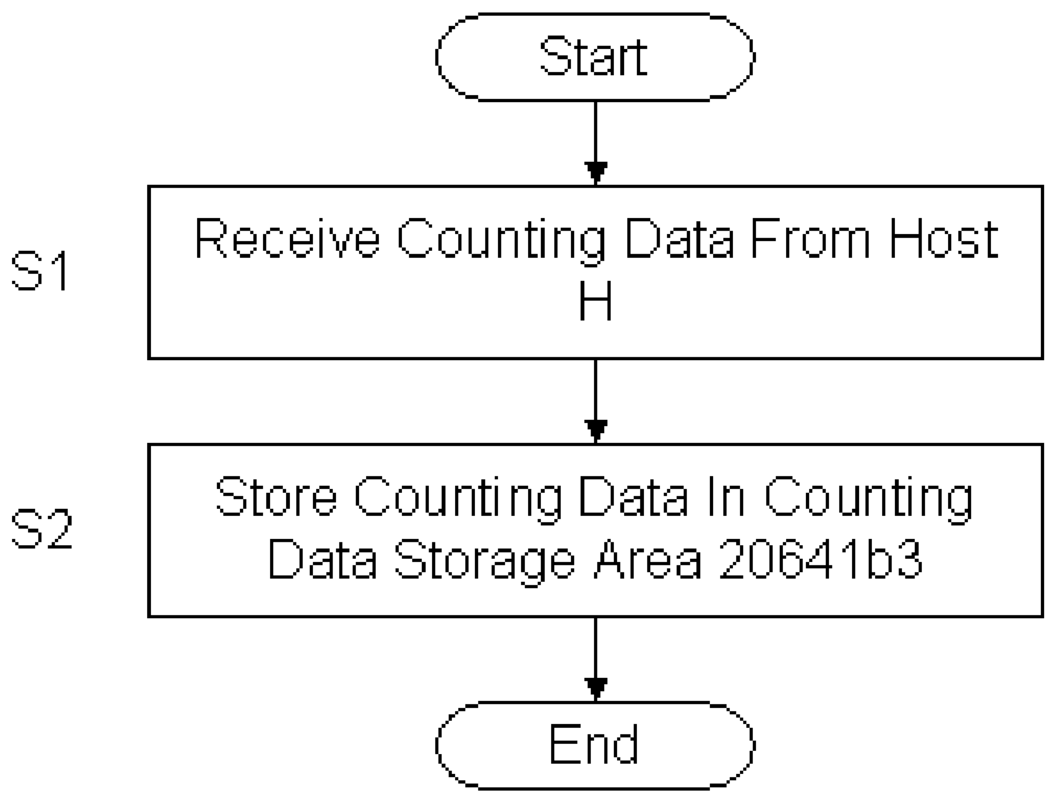

FIG. 881 is a flowchart illustrating an exemplary embodiment of the present invention.

Figure 882:
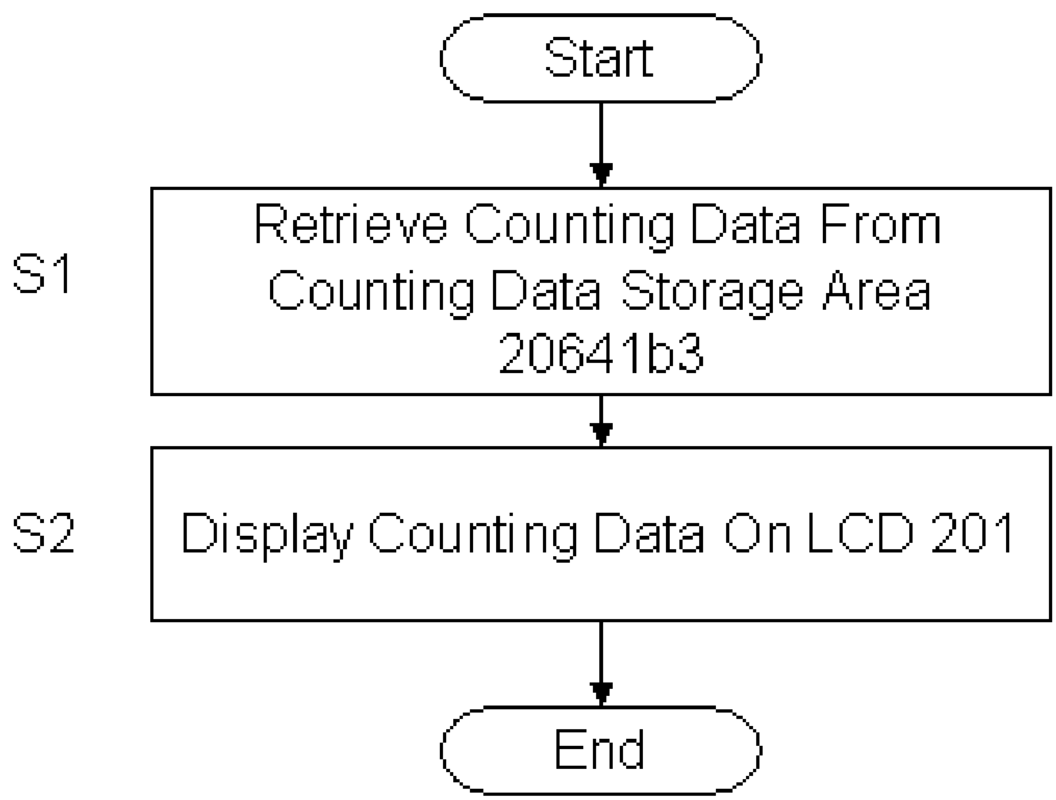

FIG. 882 is a flowchart illustrating an exemplary embodiment of the present invention.

Figure 883:
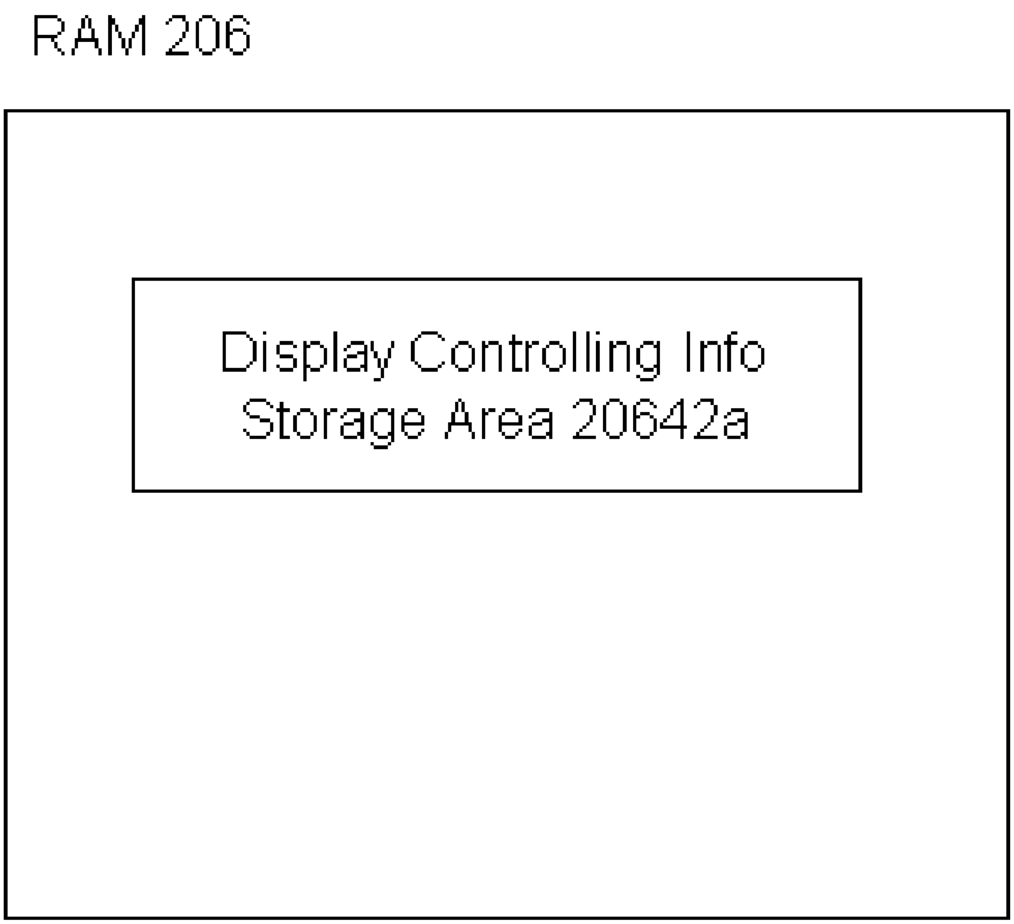

FIG. 883 is a block diagram illustrating an exemplary embodiment of the present invention.

Figure 884:
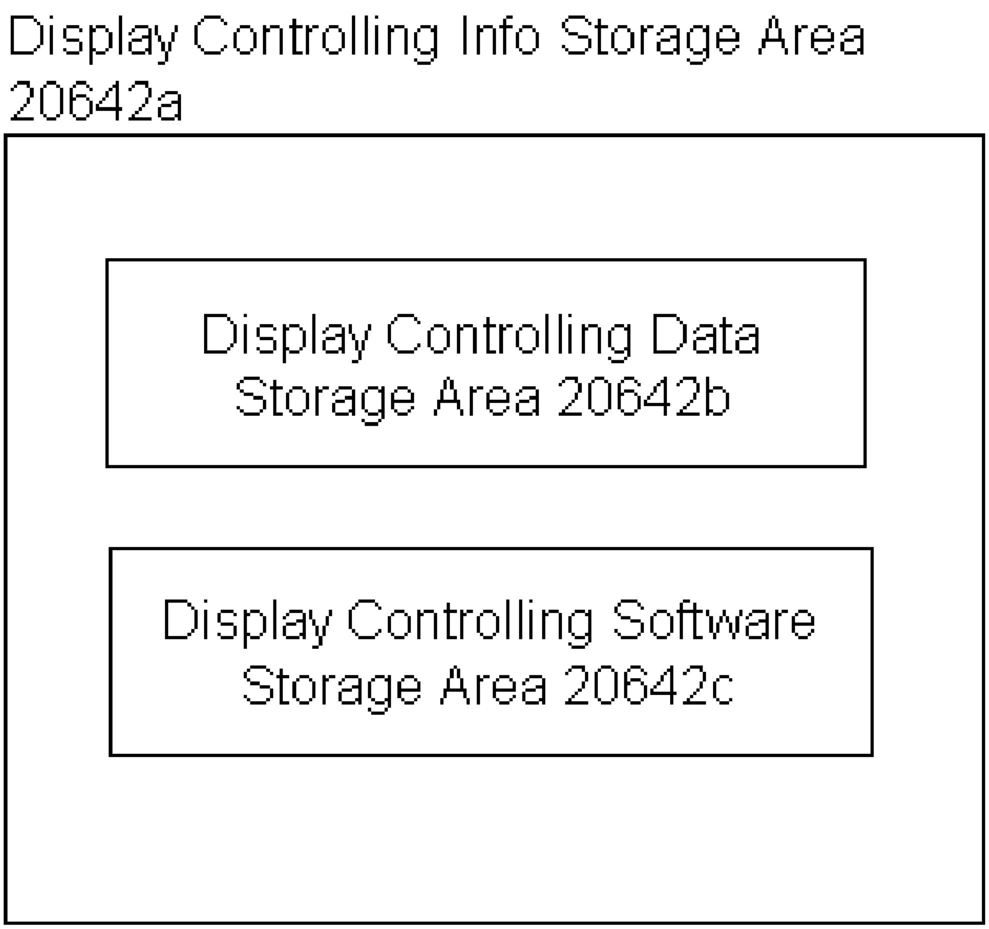

FIG. 884 is a block diagram illustrating an exemplary embodiment of the present invention.

FIG. 885 is a block diagram illustrating an exemplary embodiment of the present invention.

Figure 886:
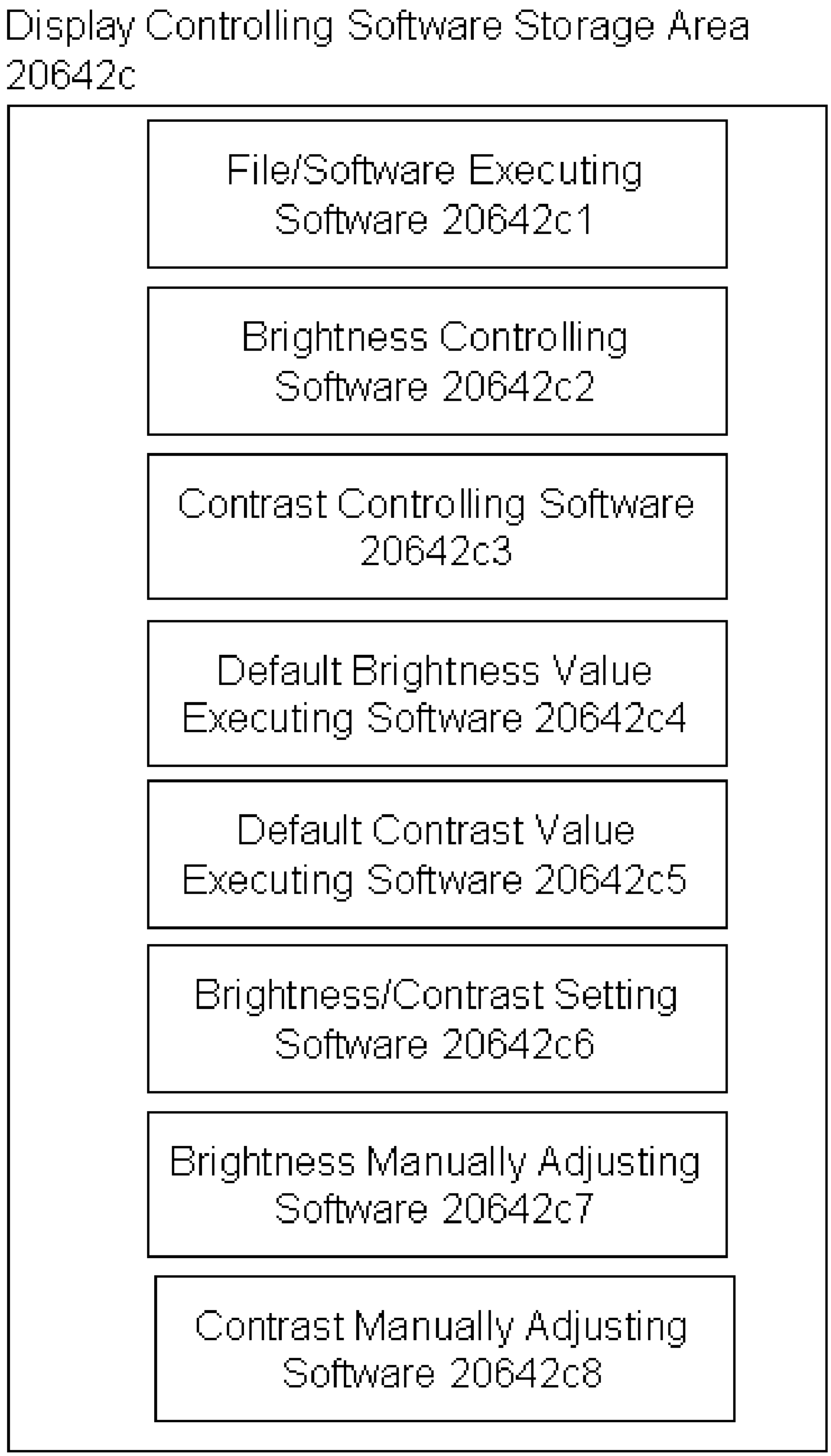

FIG. 886 is a block diagram illustrating an exemplary embodiment of the present invention.

Figure 887:
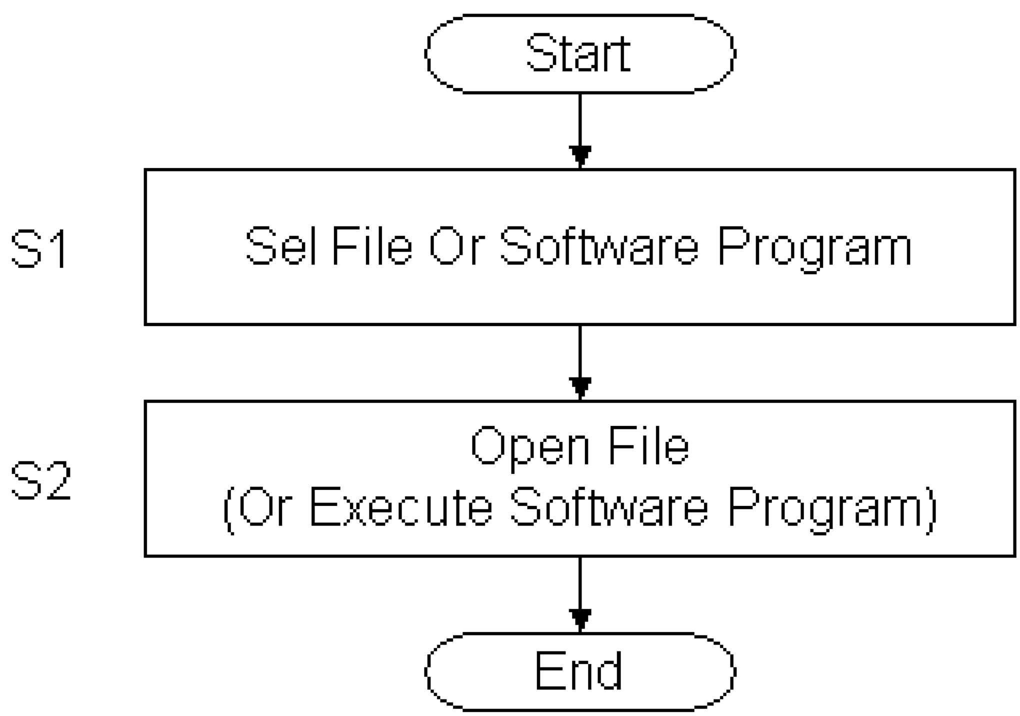

FIG. 887 is a flowchart illustrating an exemplary embodiment of the present invention.

Figure 888:
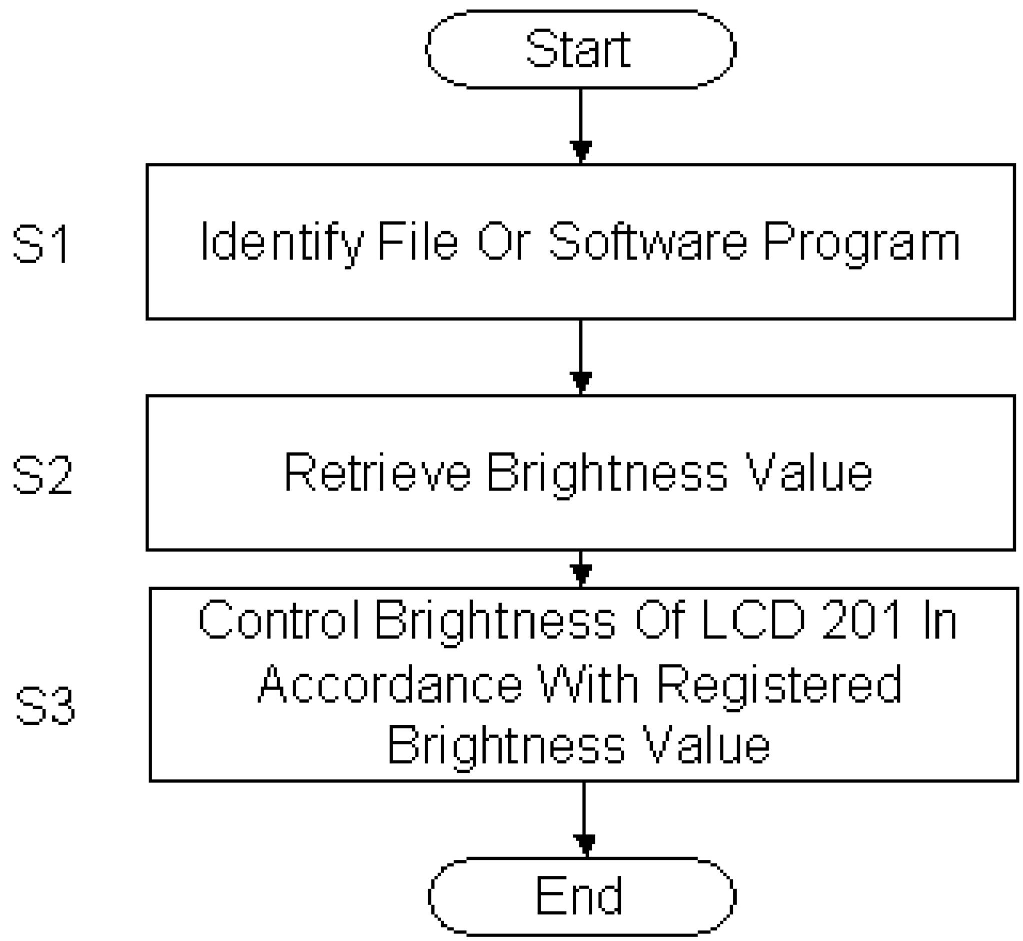

FIG. 888 is a flowchart illustrating an exemplary embodiment of the present invention.

Figure 889:
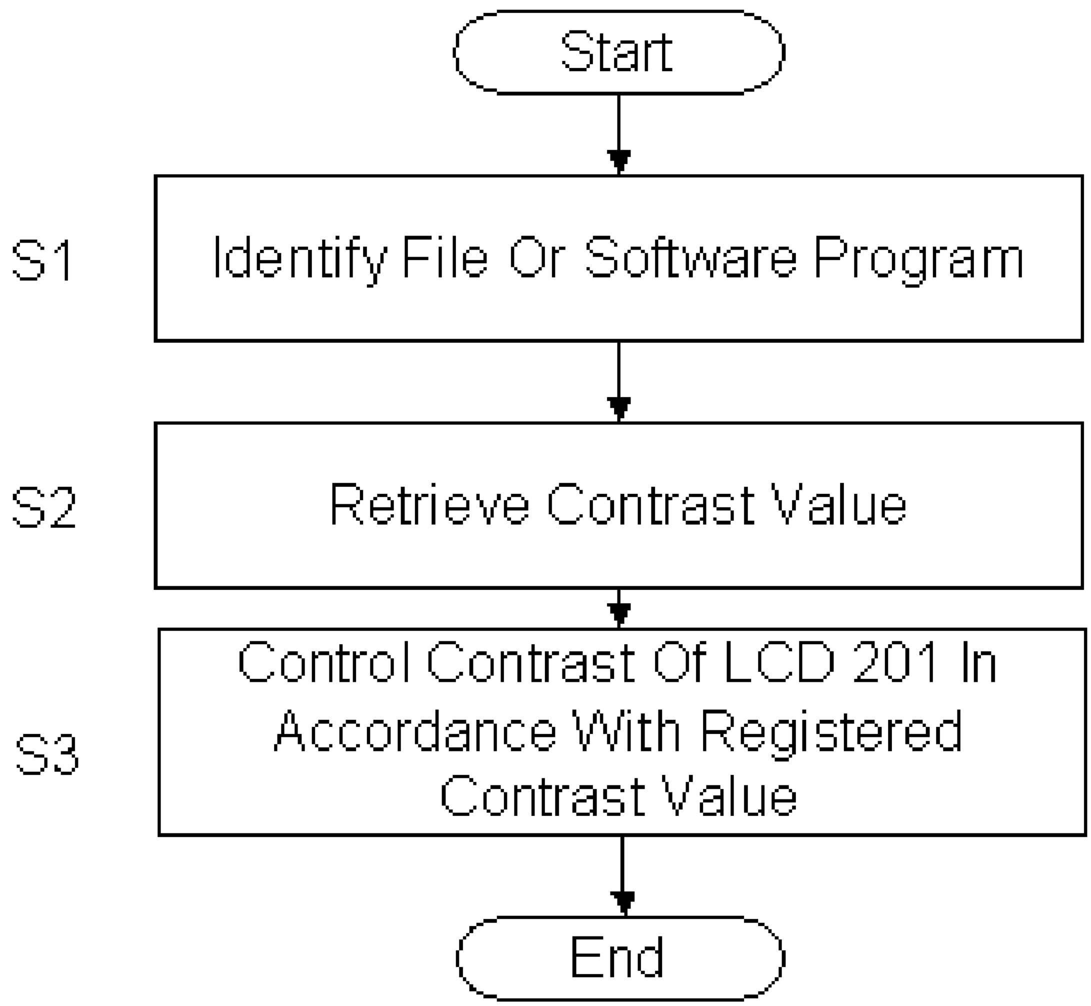

FIG. 889 is a flowchart illustrating an exemplary embodiment of the present invention.

Figure 890:
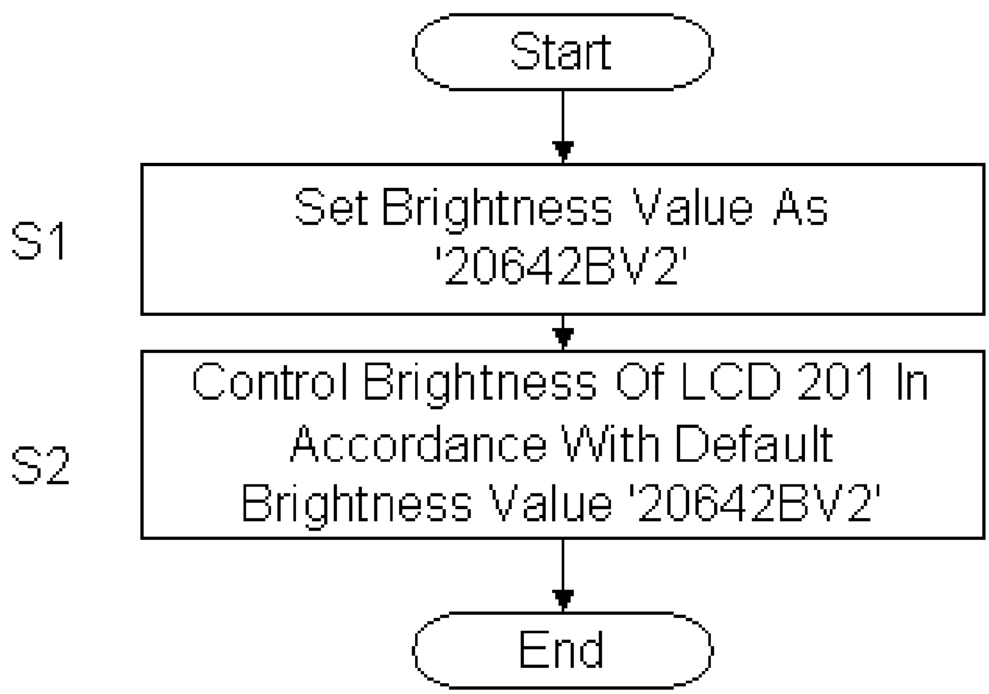

FIG. 890 is a flowchart illustrating an exemplary embodiment of the present invention.

Figure 891:
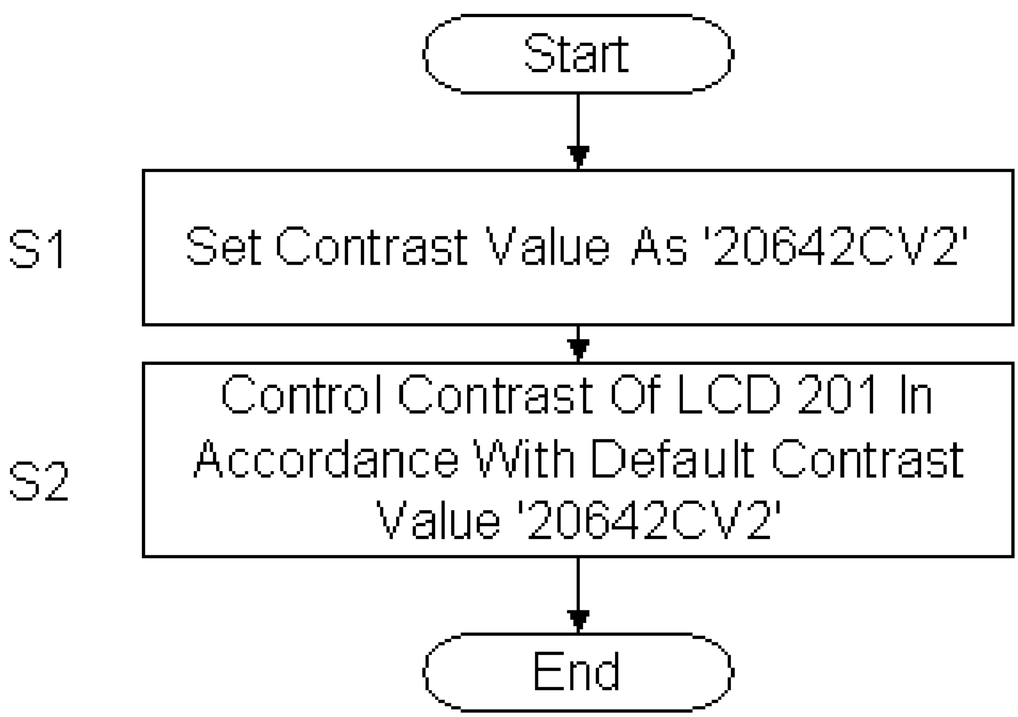

FIG. 891 is a flowchart illustrating an exemplary embodiment of the present invention.

Figure 892:
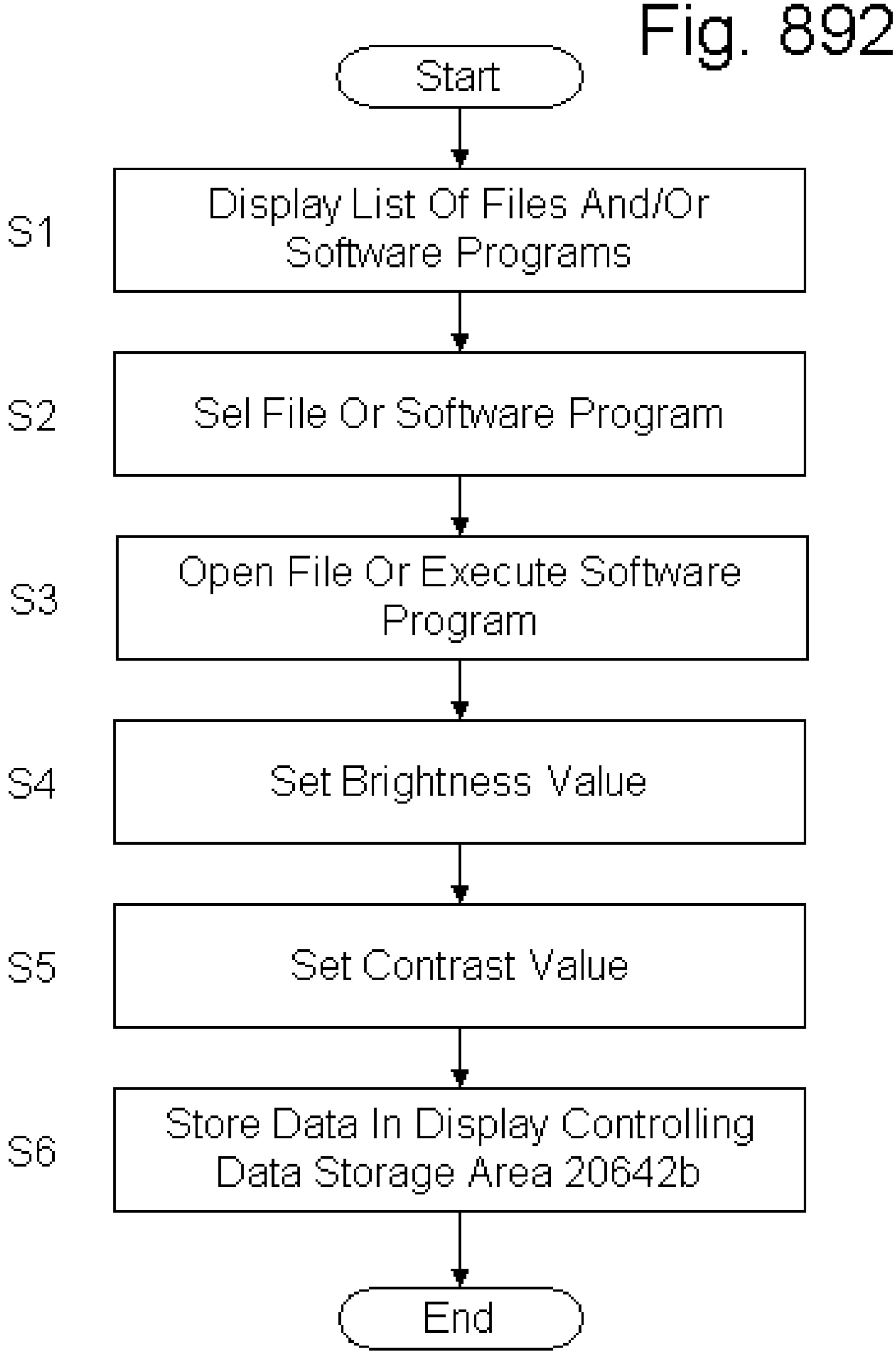

FIG. 892 is a flowchart illustrating an exemplary embodiment of the present invention.

Figure 893:
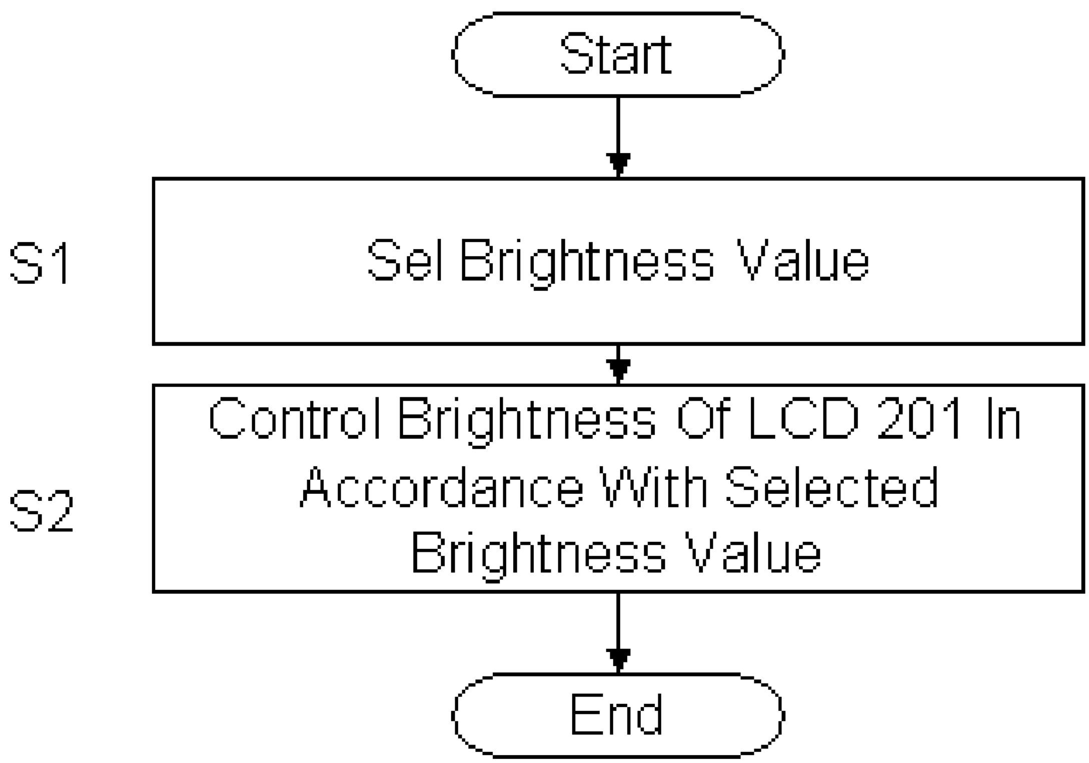

FIG. 893 is a flowchart illustrating an exemplary embodiment of the present invention.

Figure 894:
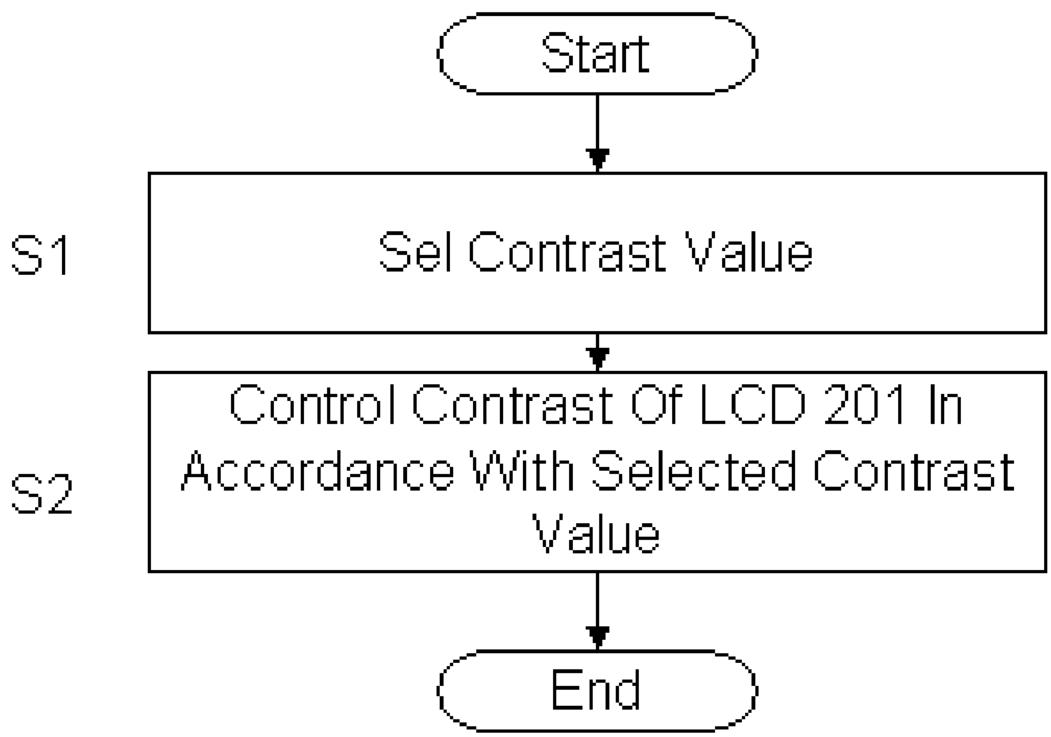

FIG. 894 is a flowchart illustrating an exemplary embodiment of the present invention.

Figure 894A:
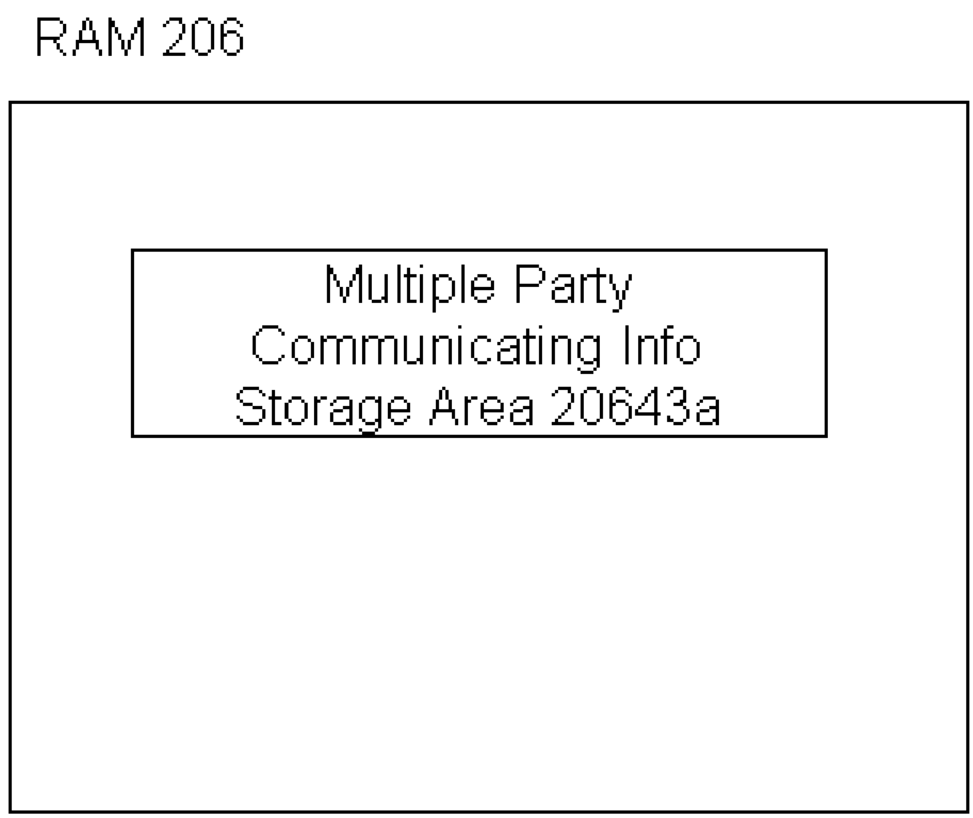

FIG. 894*a* is a block diagram illustrating an exemplary embodiment of the present invention.

Figure 895:
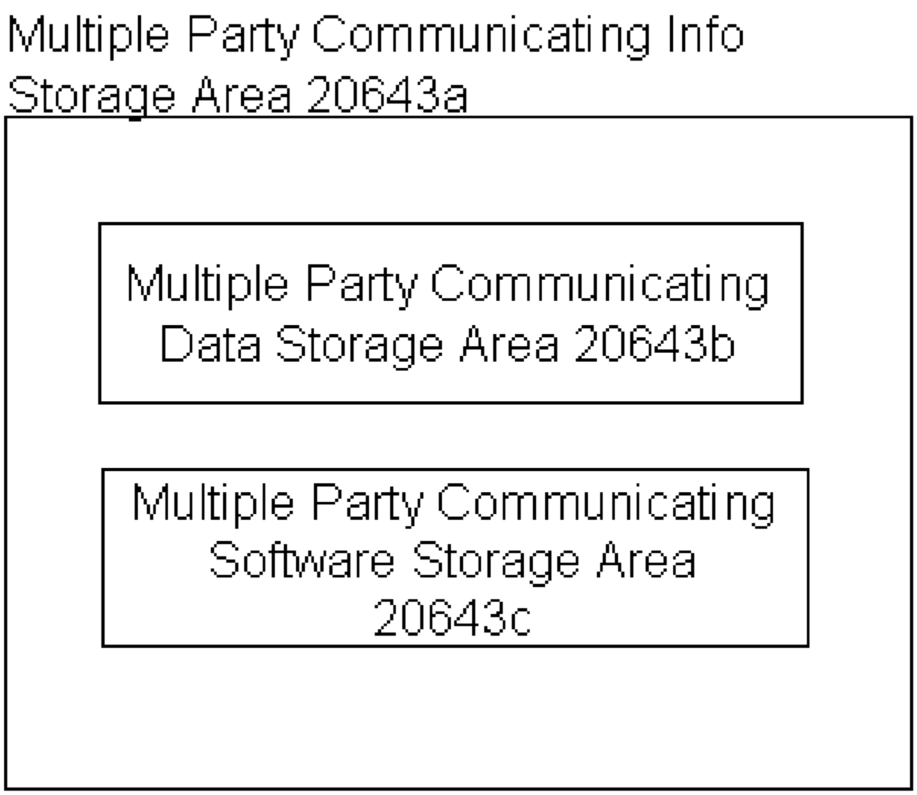

FIG. 895 is a block diagram illustrating an exemplary embodiment of the present invention.

Figure 896:
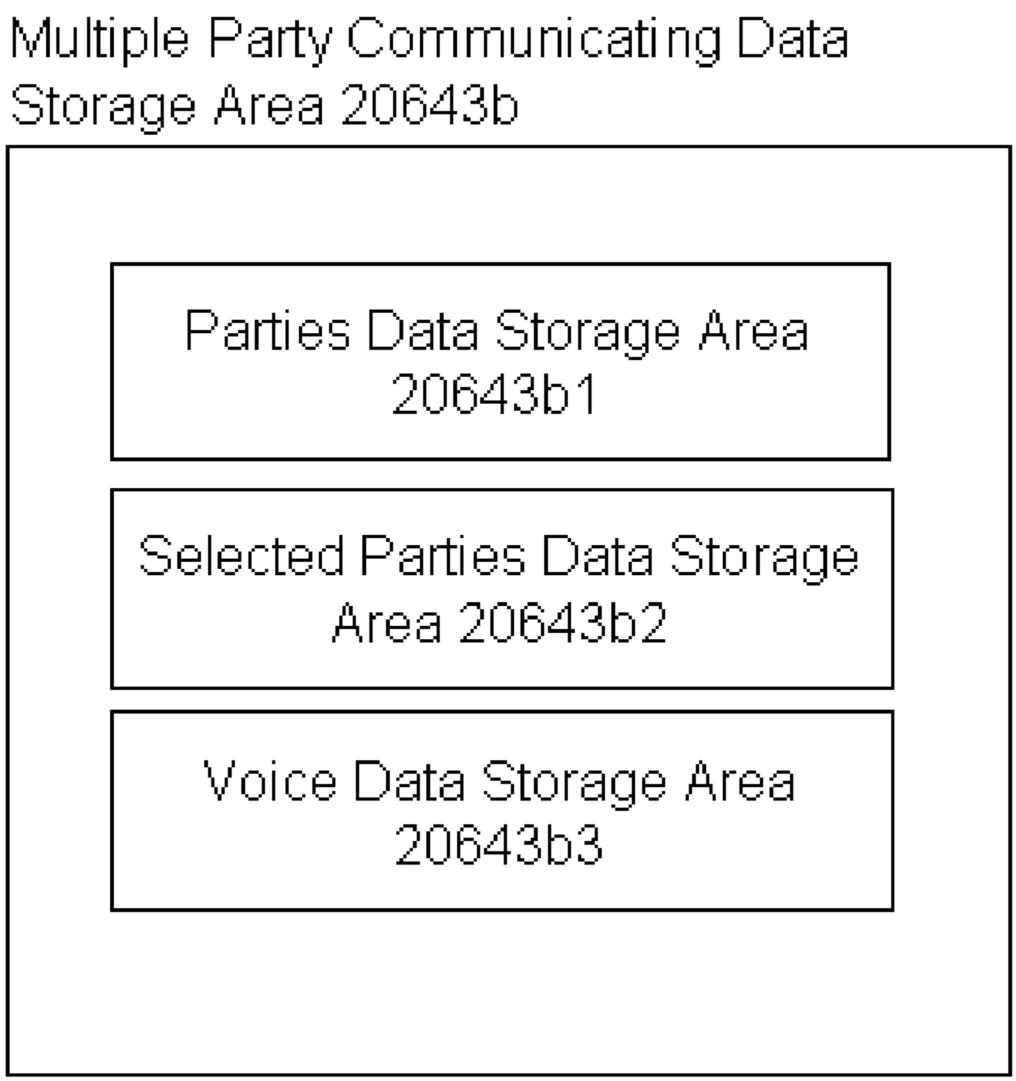

FIG. 896 is a block diagram illustrating an exemplary embodiment of the present invention.

FIG. 897 is a block diagram illustrating an exemplary embodiment of the present invention.

FIG. 898 is a block diagram illustrating an exemplary embodiment of the present invention.

Figure 899:
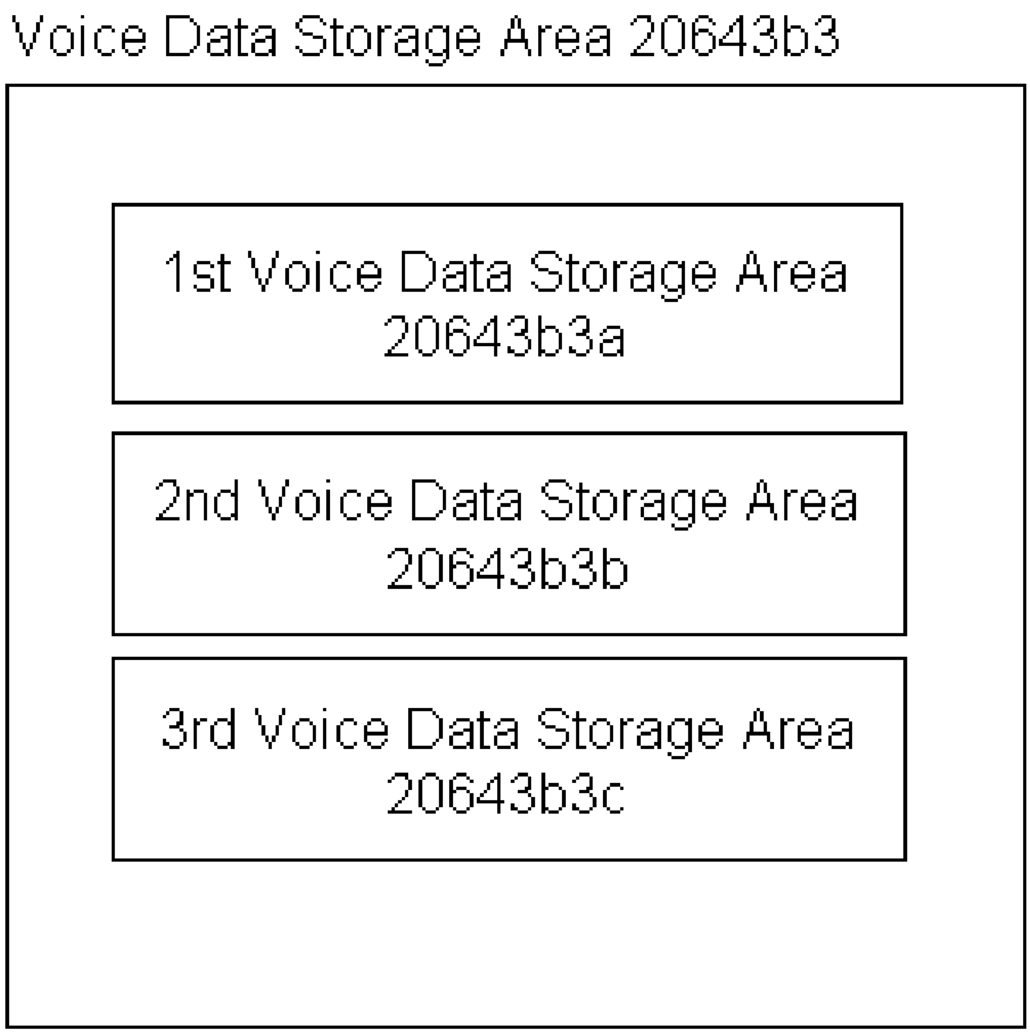

FIG. 899 is a block diagram illustrating an exemplary embodiment of the present invention.

Figure 900:

FIG. 900 is a block diagram illustrating an exemplary embodiment of the present invention.

Figure 901:
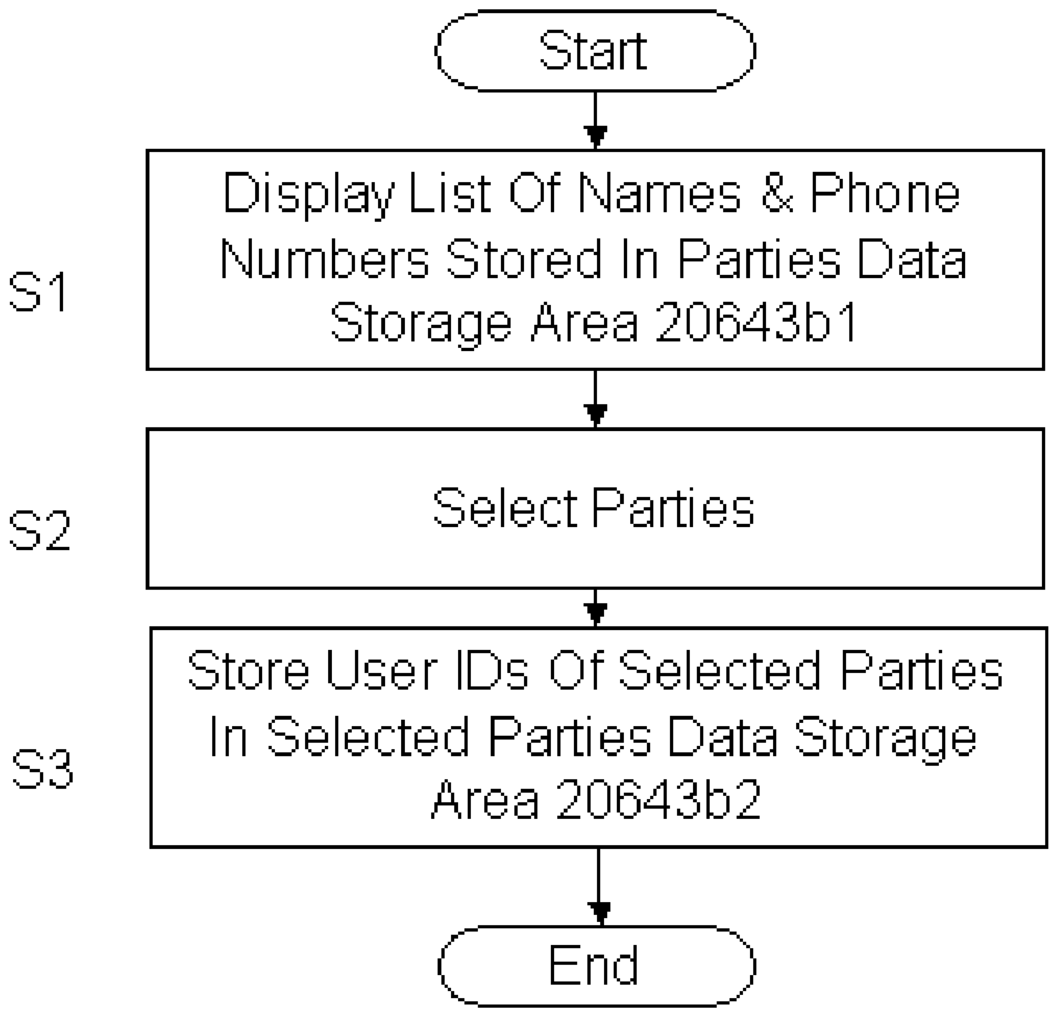

FIG. 901 is a flowchart illustrating an exemplary embodiment of the present invention.

Figure 902:
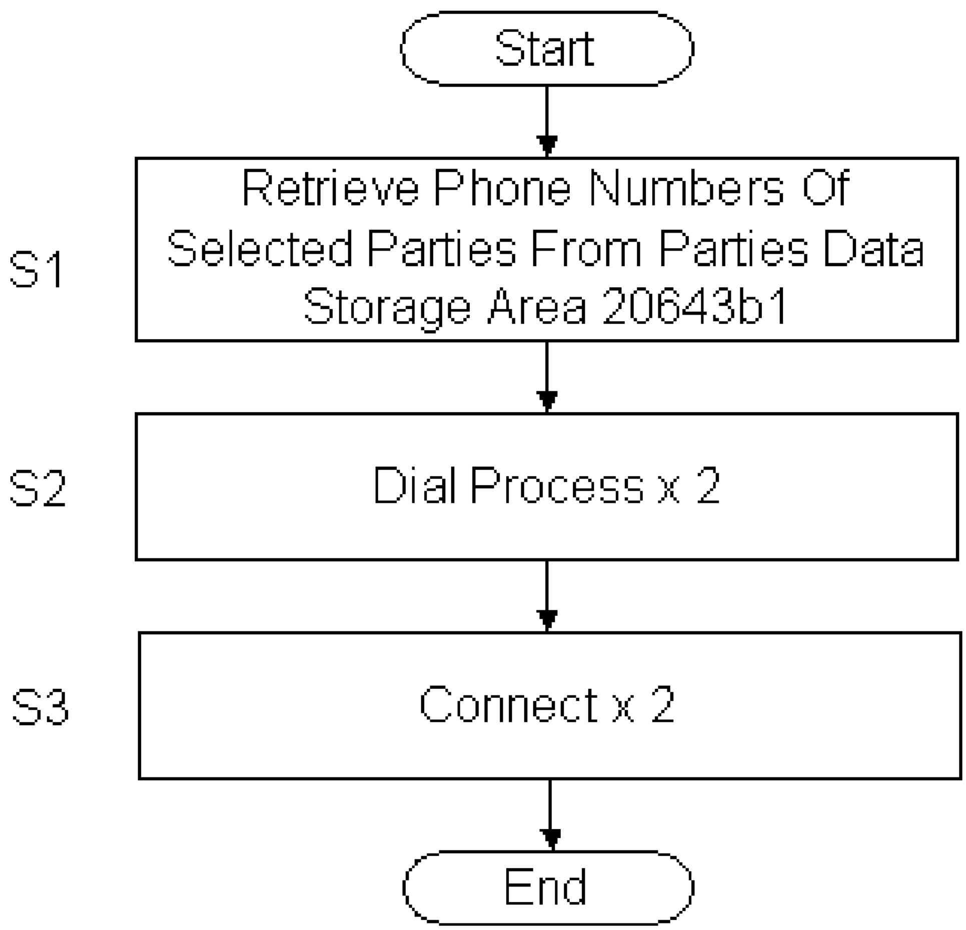

FIG. 902 is a flowchart illustrating an exemplary embodiment of the present invention.

Figure 903:
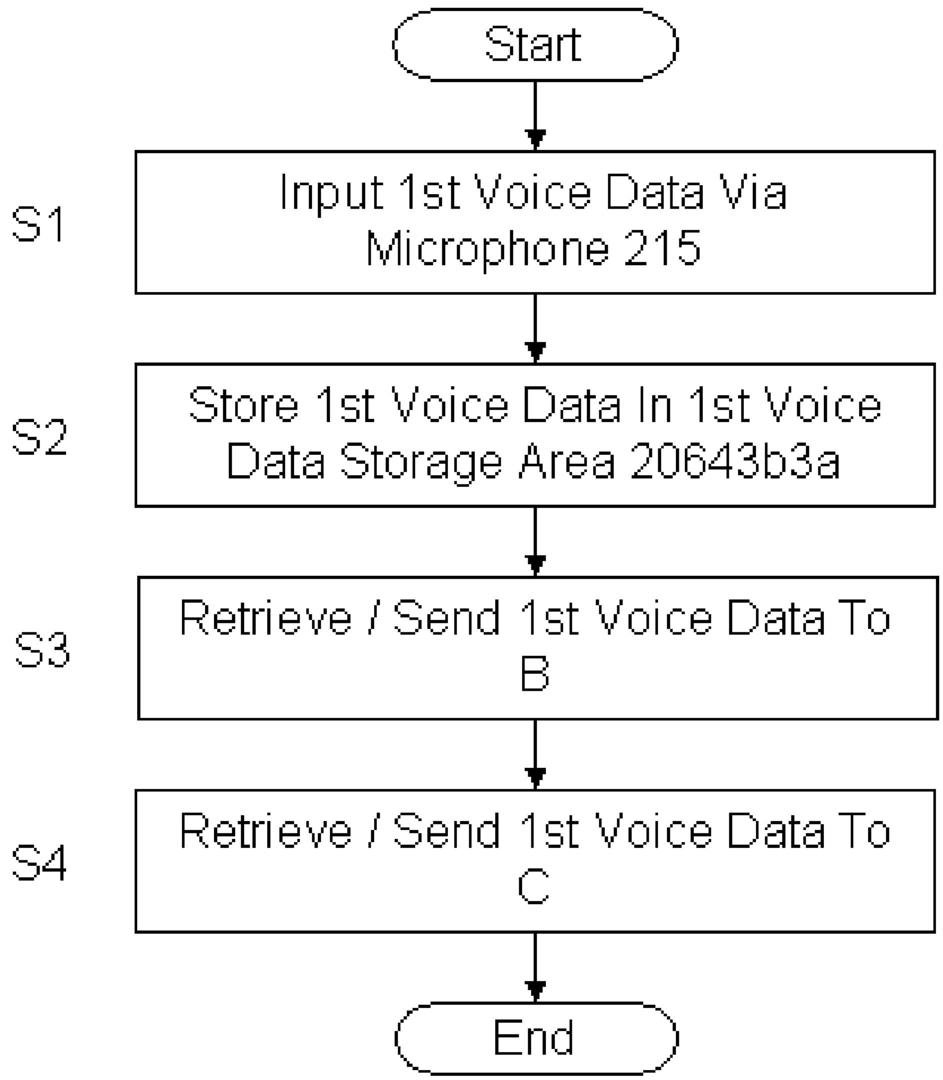

FIG. 903 is a flowchart illustrating an exemplary embodiment of the present invention.

Figure 904:
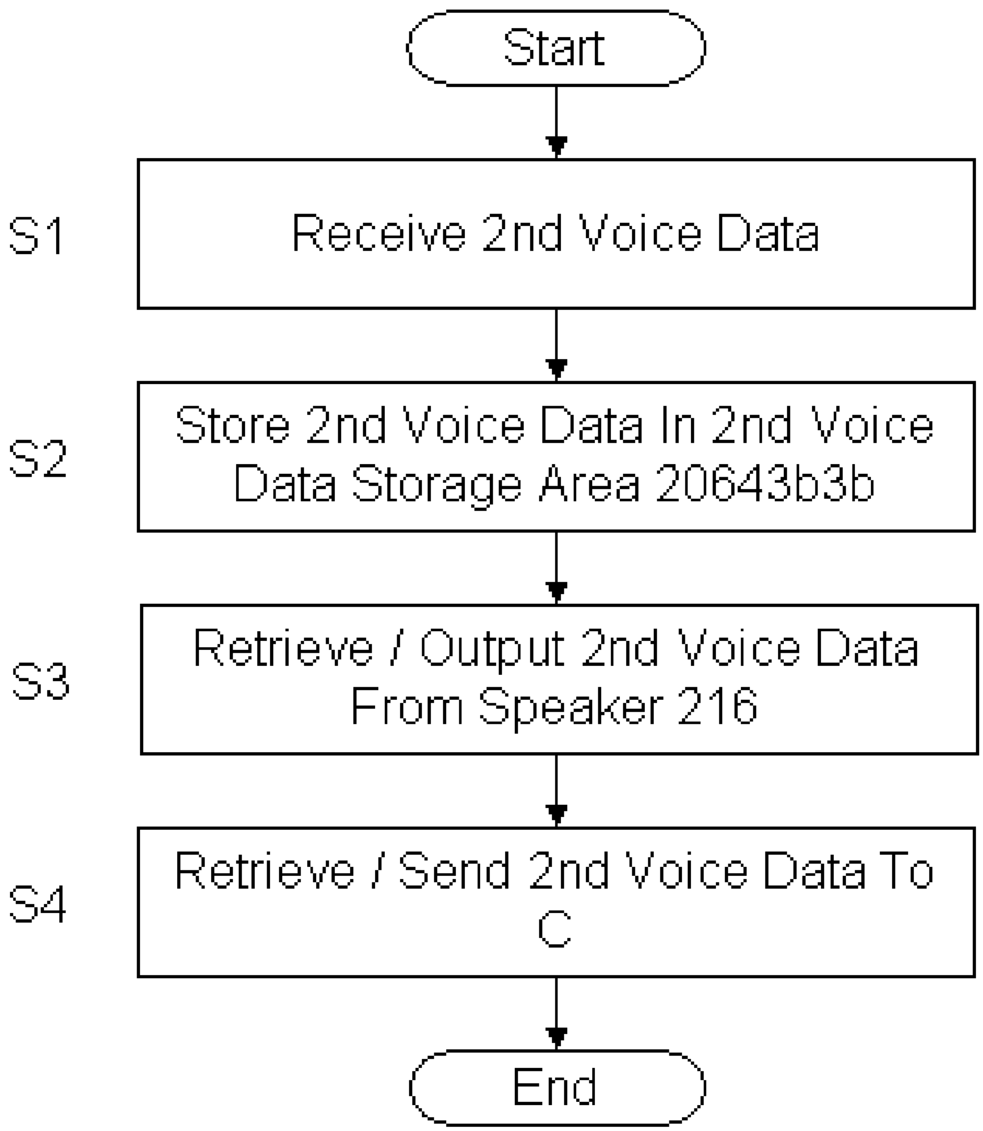

FIG. 904 is a flowchart illustrating an exemplary embodiment of the present invention.

Figure 905:
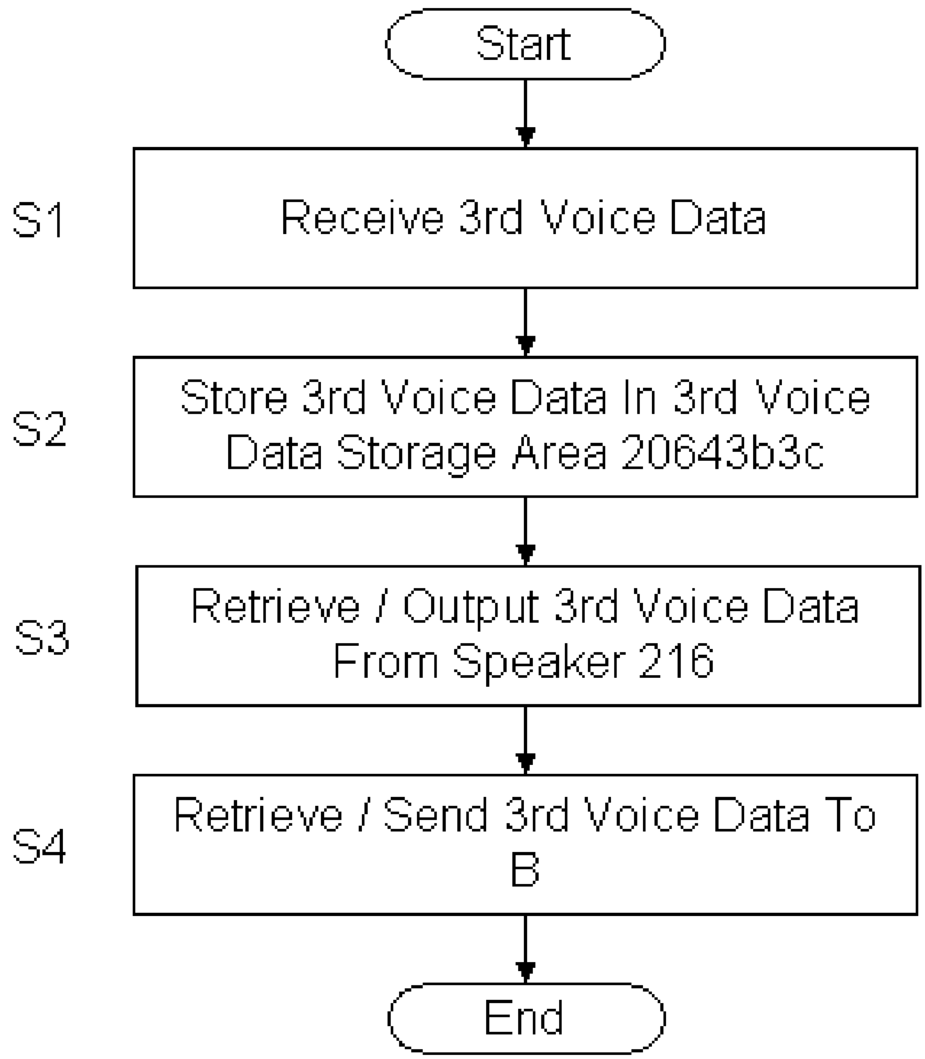

FIG. 905 is a flowchart illustrating an exemplary embodiment of the present invention.

Figure 906:
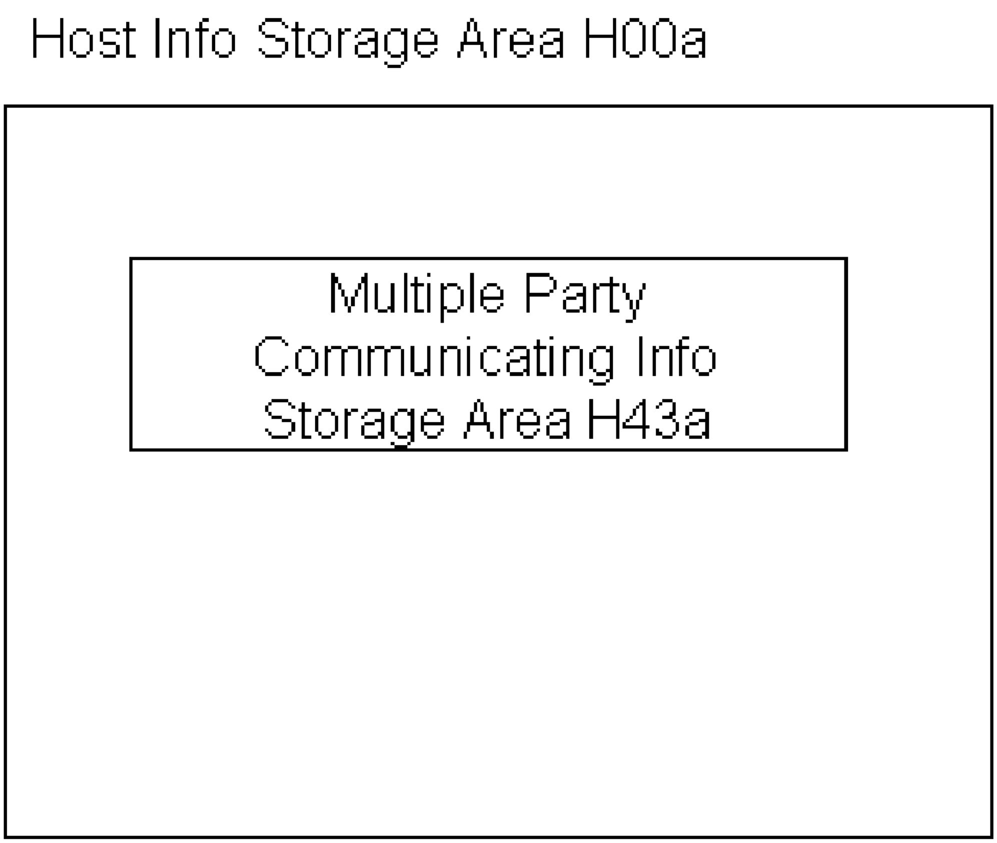

FIG. 906 is a block diagram illustrating an exemplary embodiment of the present invention.

Figure 907:
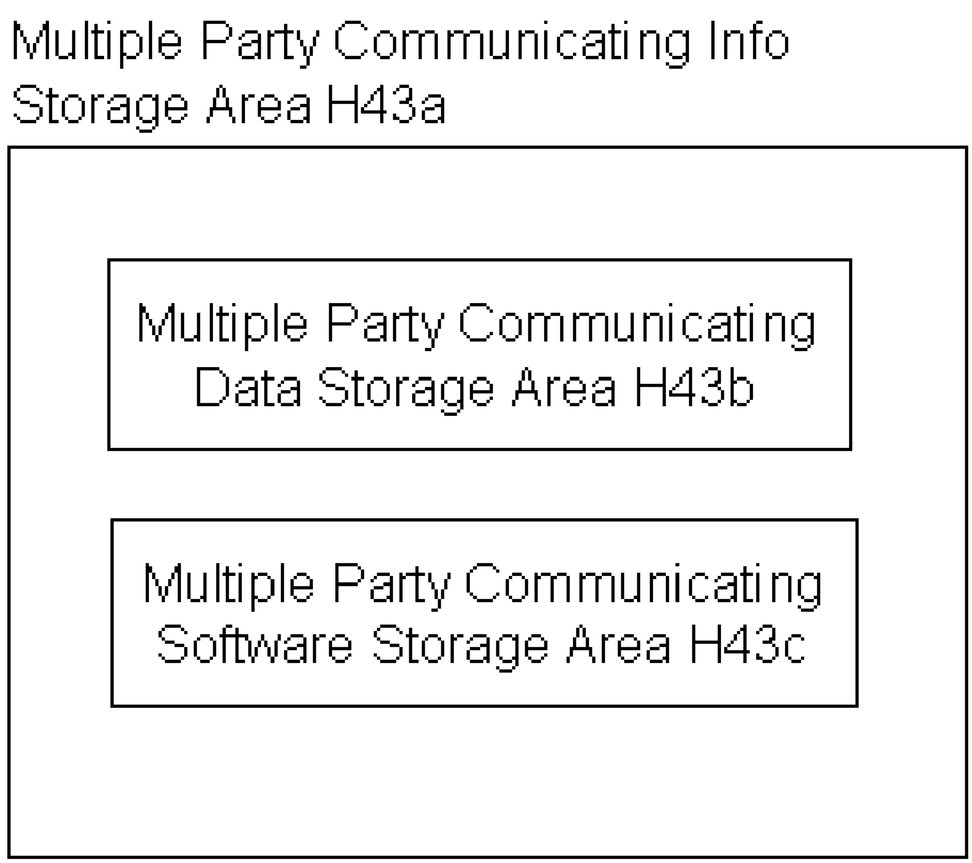

FIG. 907 is a block diagram illustrating an exemplary embodiment of the present invention.

Figure 908:
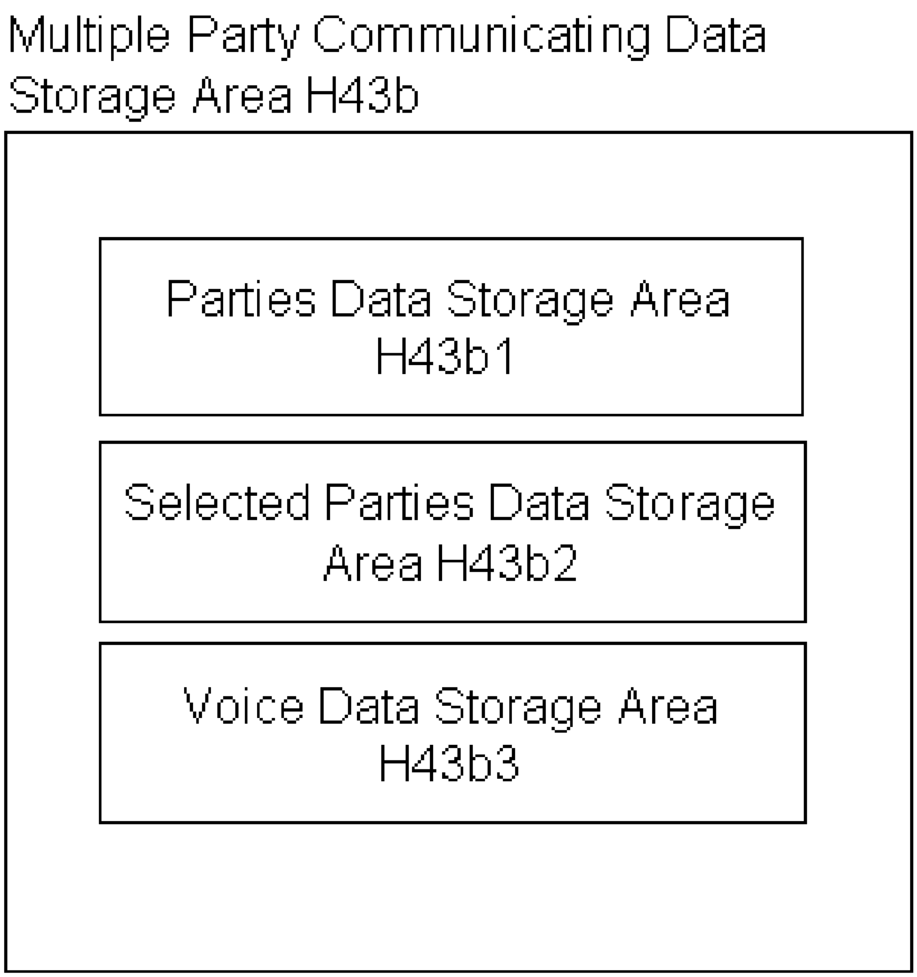

FIG. 908 is a block diagram illustrating an exemplary embodiment of the present invention.

FIG. 909 is a block diagram illustrating an exemplary embodiment of the present invention.

Figure 910:
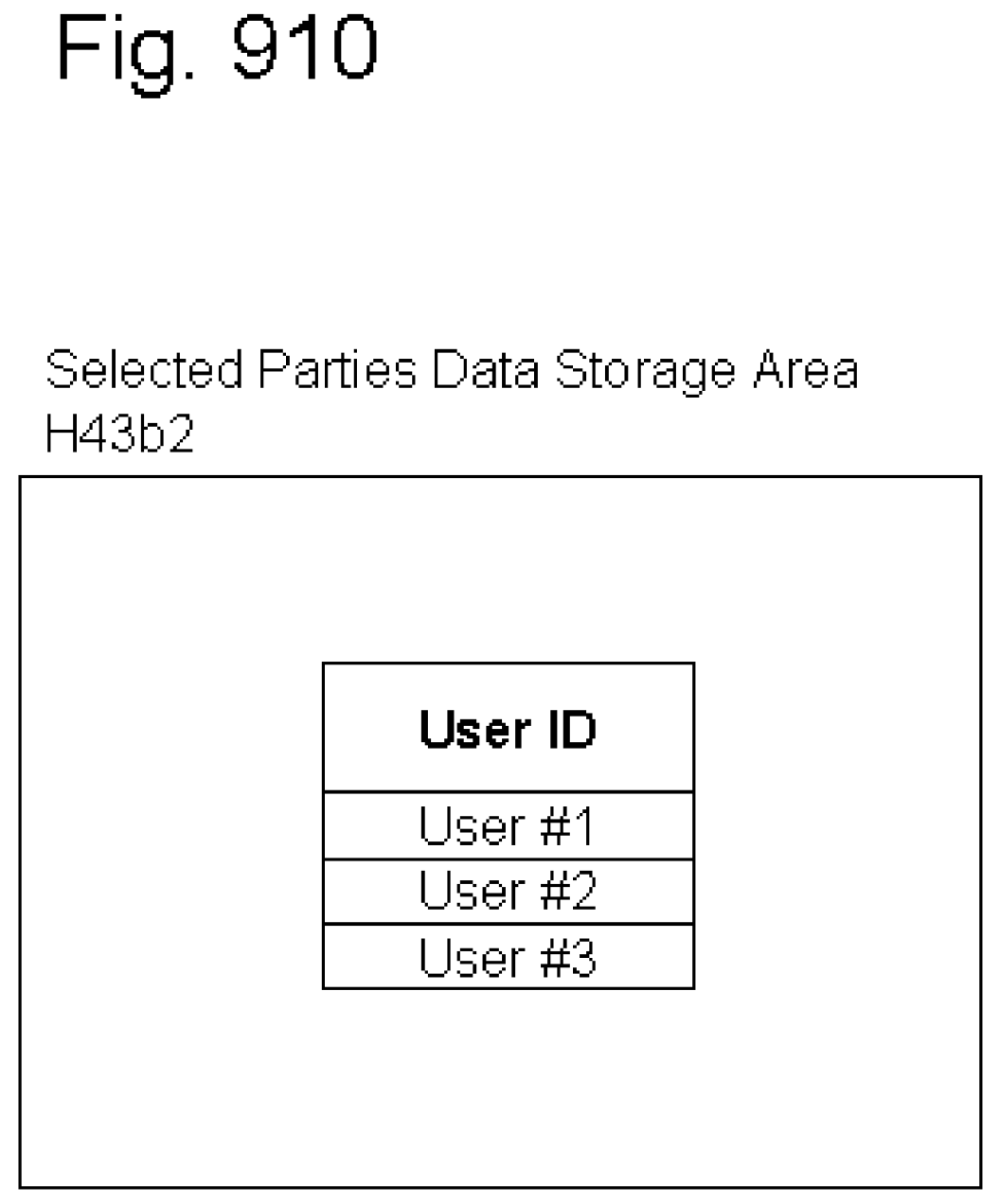

FIG. 910 is a block diagram illustrating an exemplary embodiment of the present invention.

Figure 911:
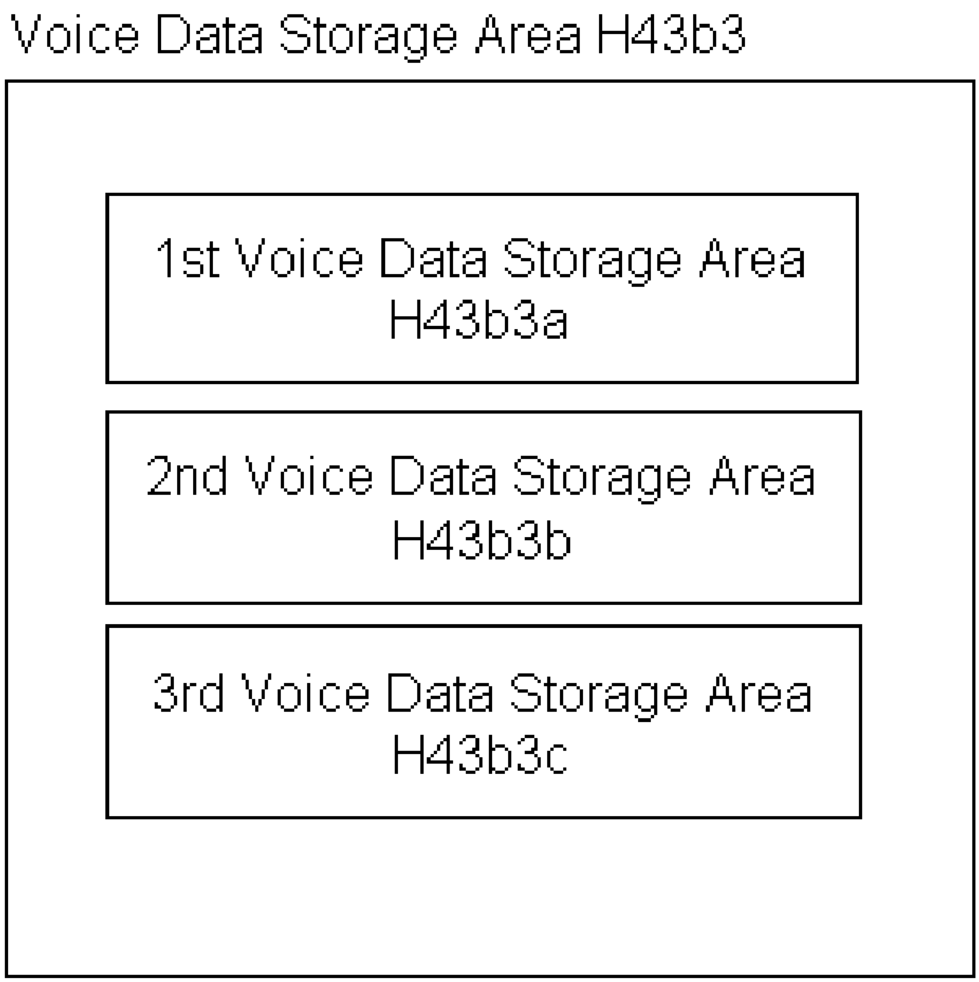

FIG. 911 is a block diagram illustrating an exemplary embodiment of the present invention.

Figure 912:
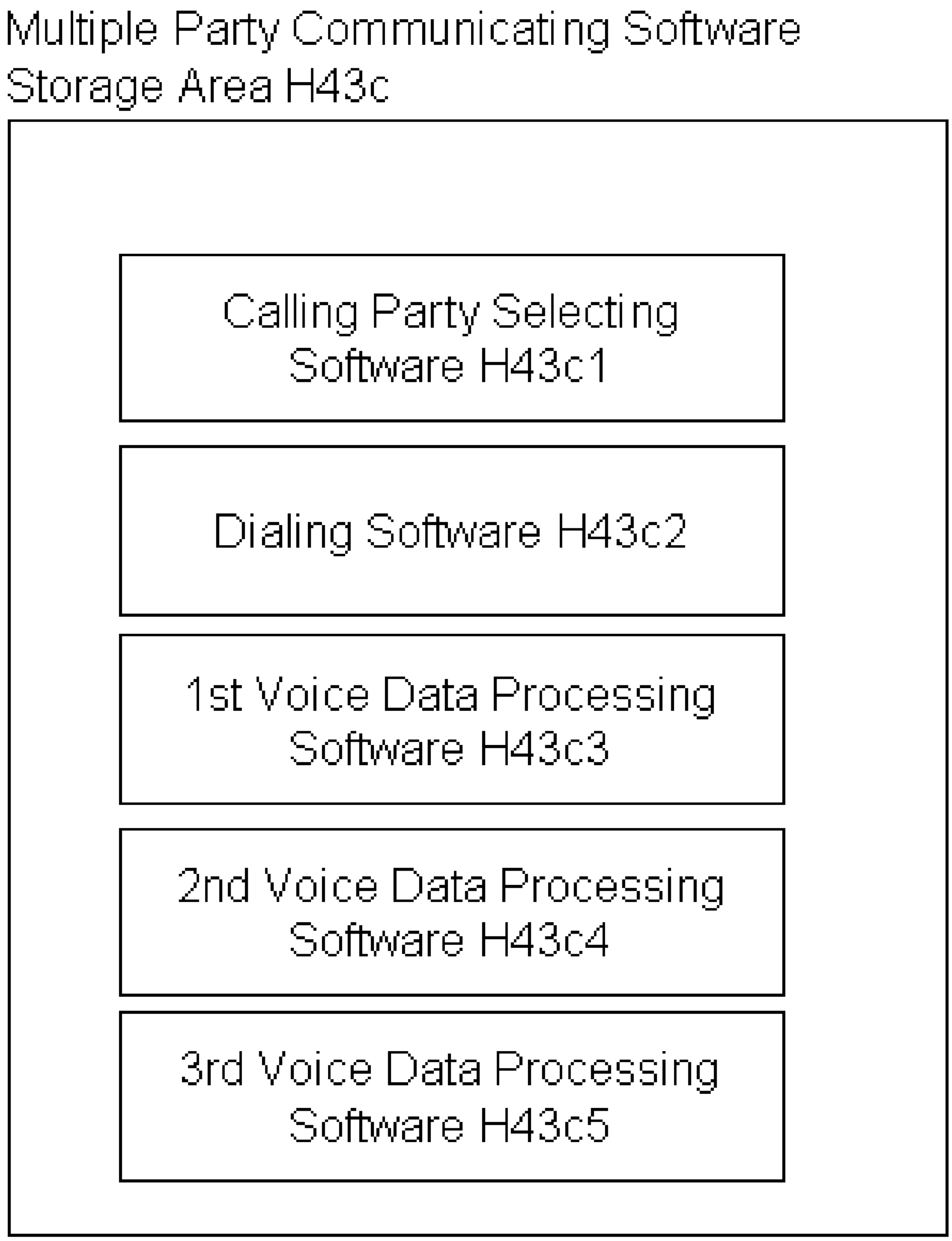

FIG. 912 is a block diagram illustrating an exemplary embodiment of the present invention.

Figure 913:
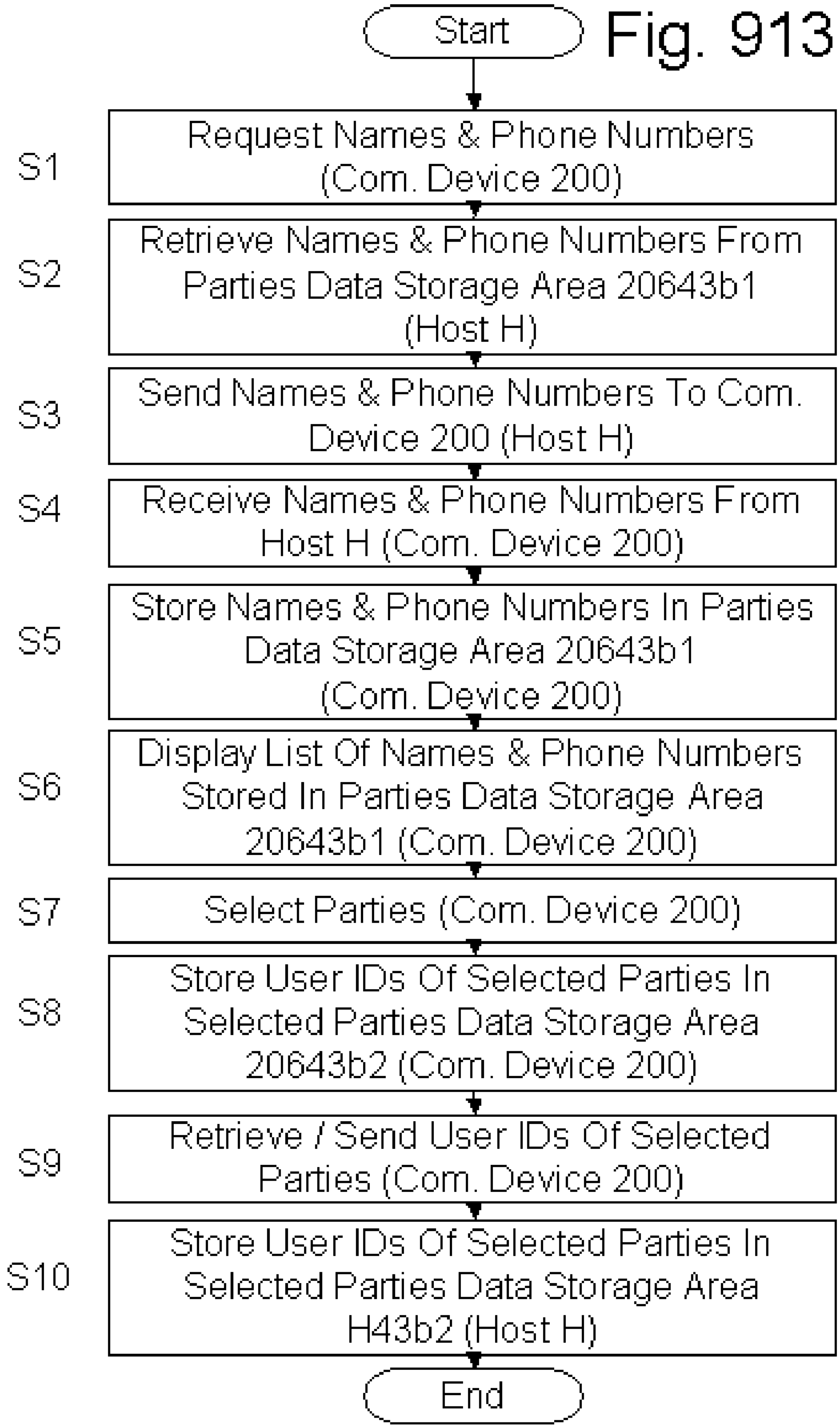

FIG. 913 is a flowchart illustrating an exemplary embodiment of the present invention.

Figure 914:
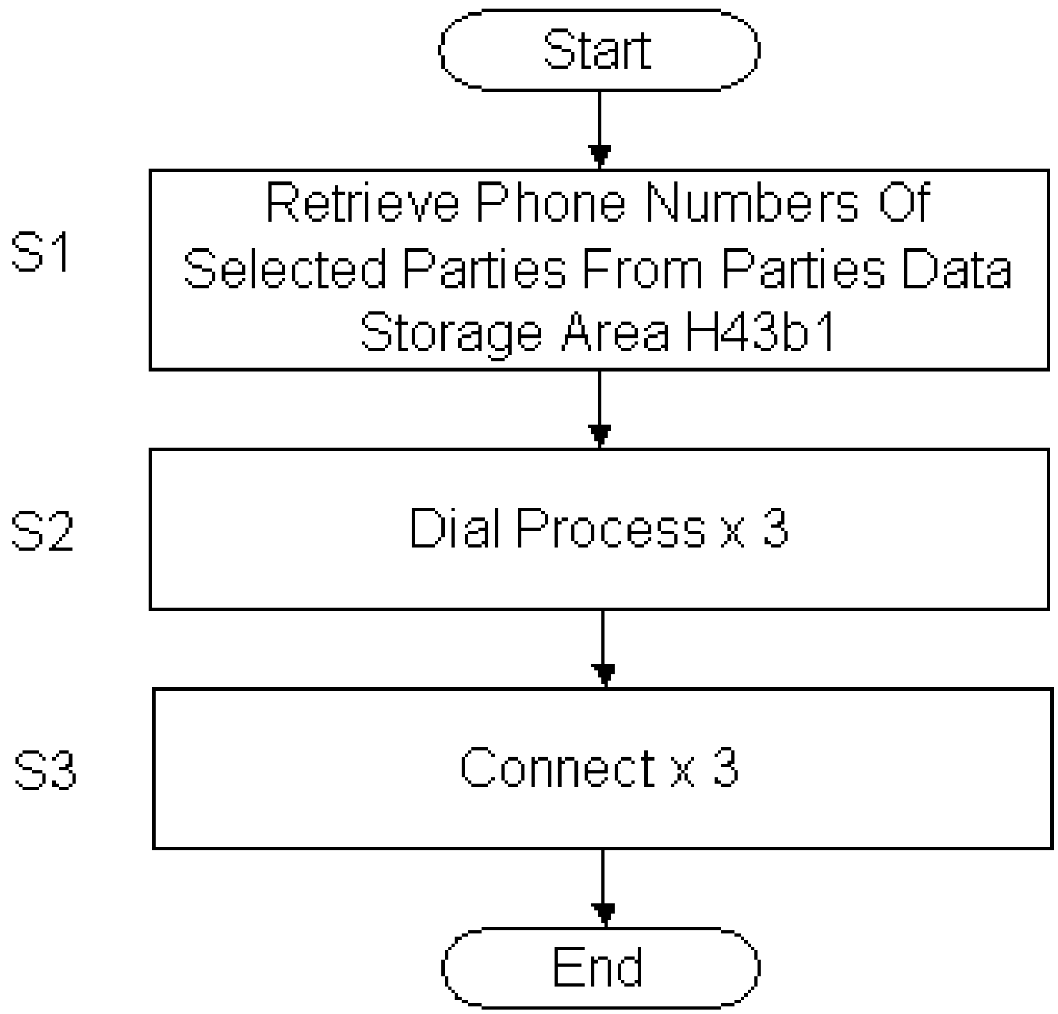

FIG. 914 is a flowchart illustrating an exemplary embodiment of the present invention.

Figure 915:
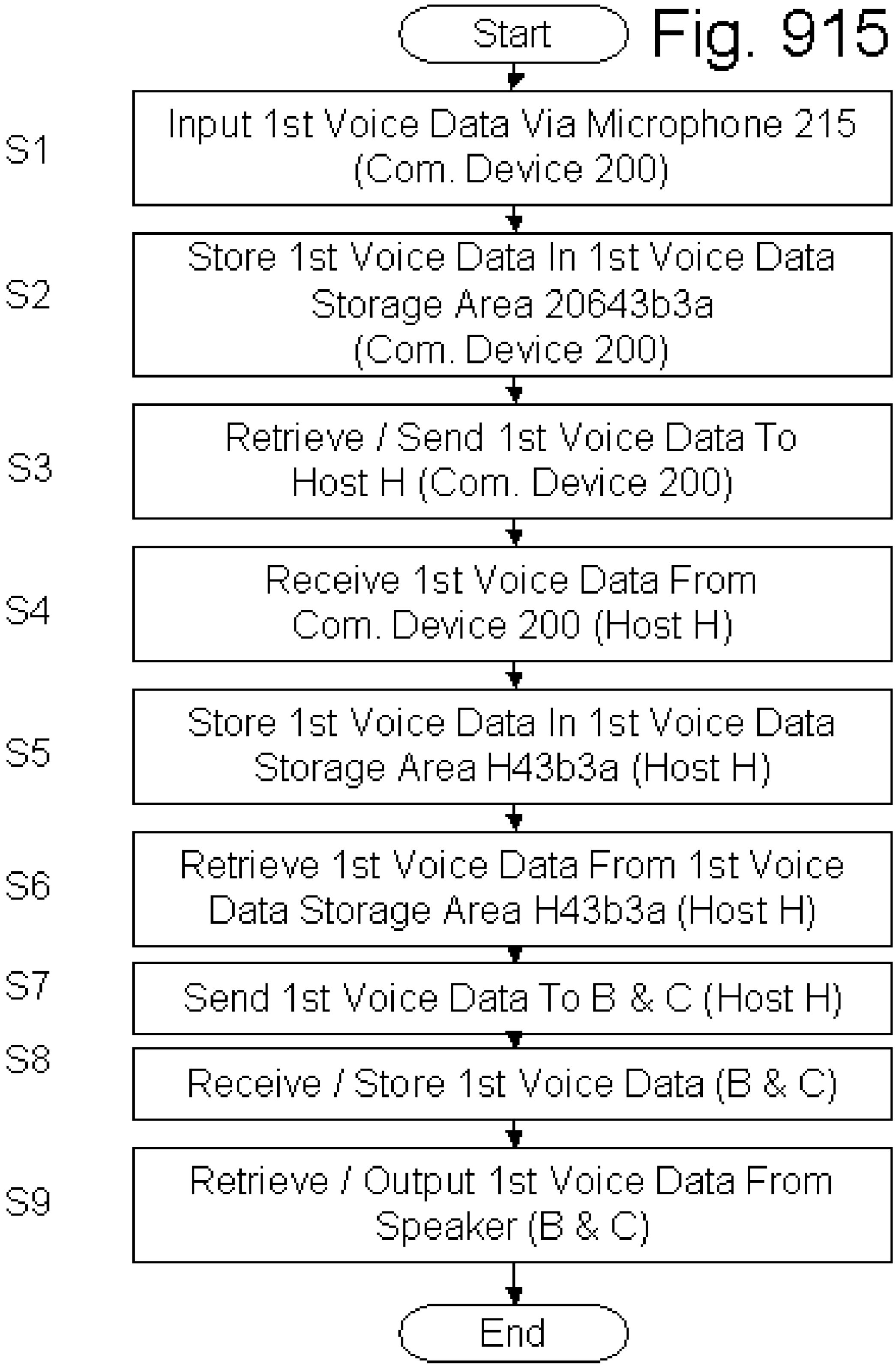

FIG. 915 is a flowchart illustrating an exemplary embodiment of the present invention.

Figure 916:
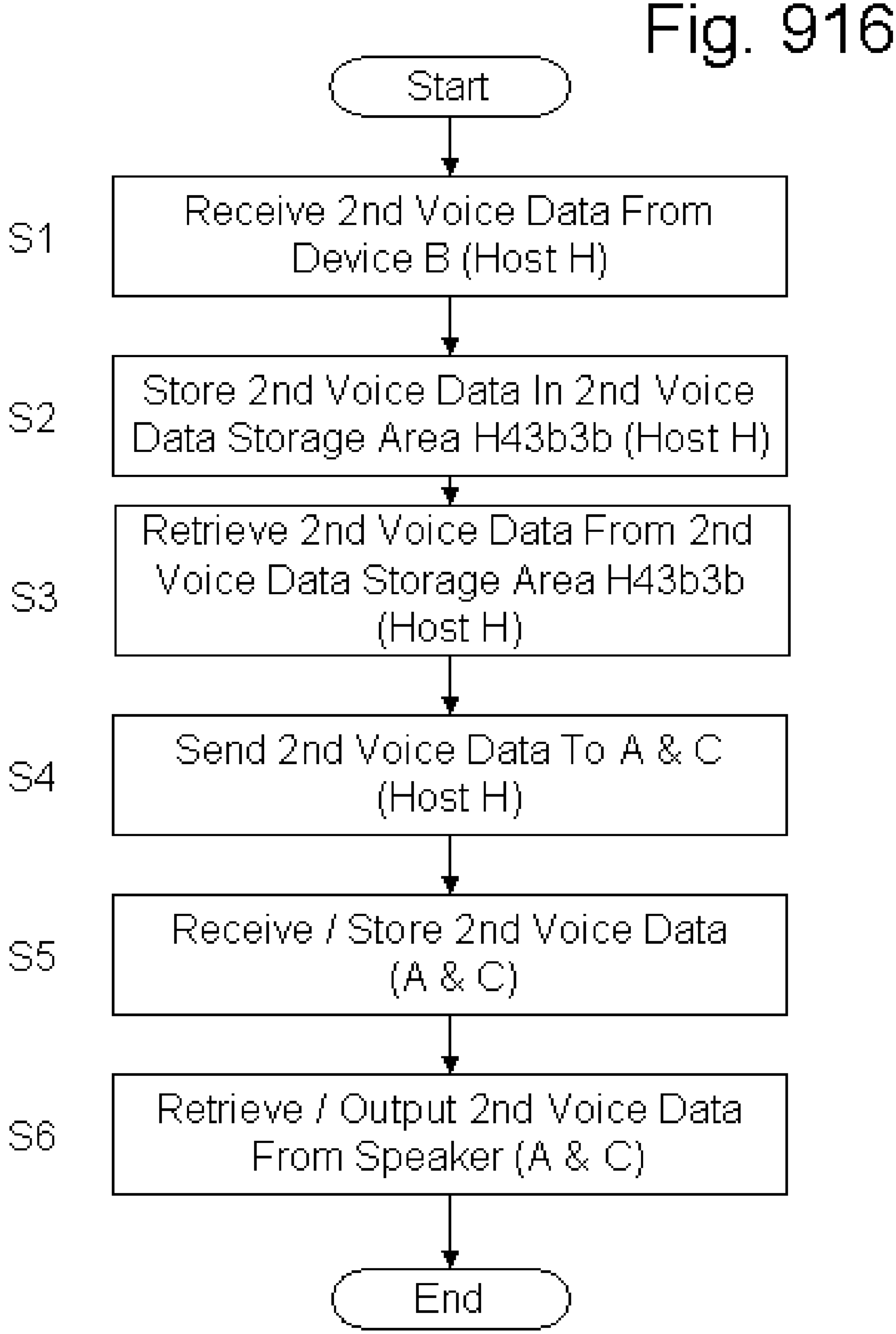

FIG. 916 is a flowchart illustrating an exemplary embodiment of the present invention.

Figure 917:
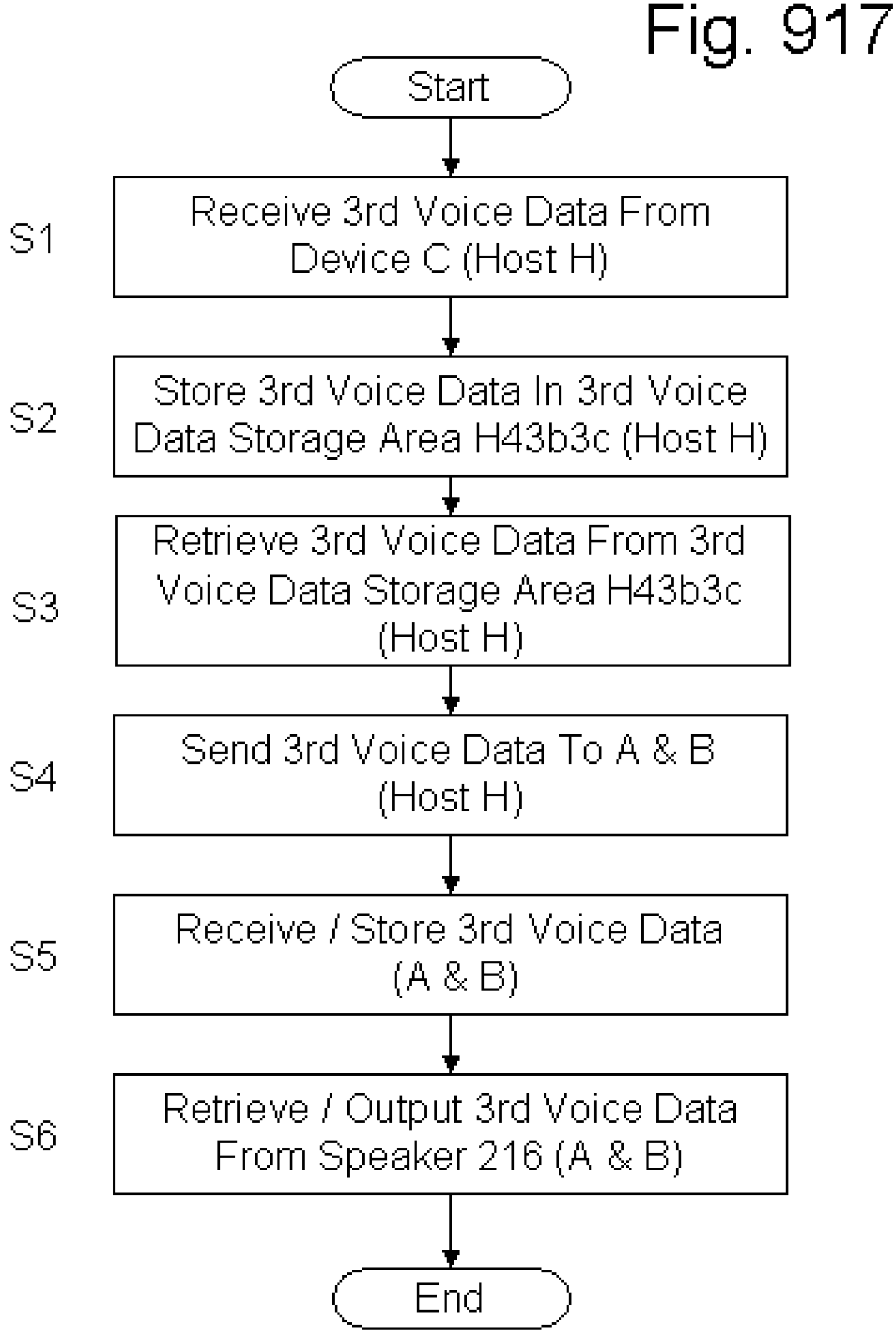

FIG. 917 is a flowchart illustrating an exemplary embodiment of the present invention.

Figure 918:
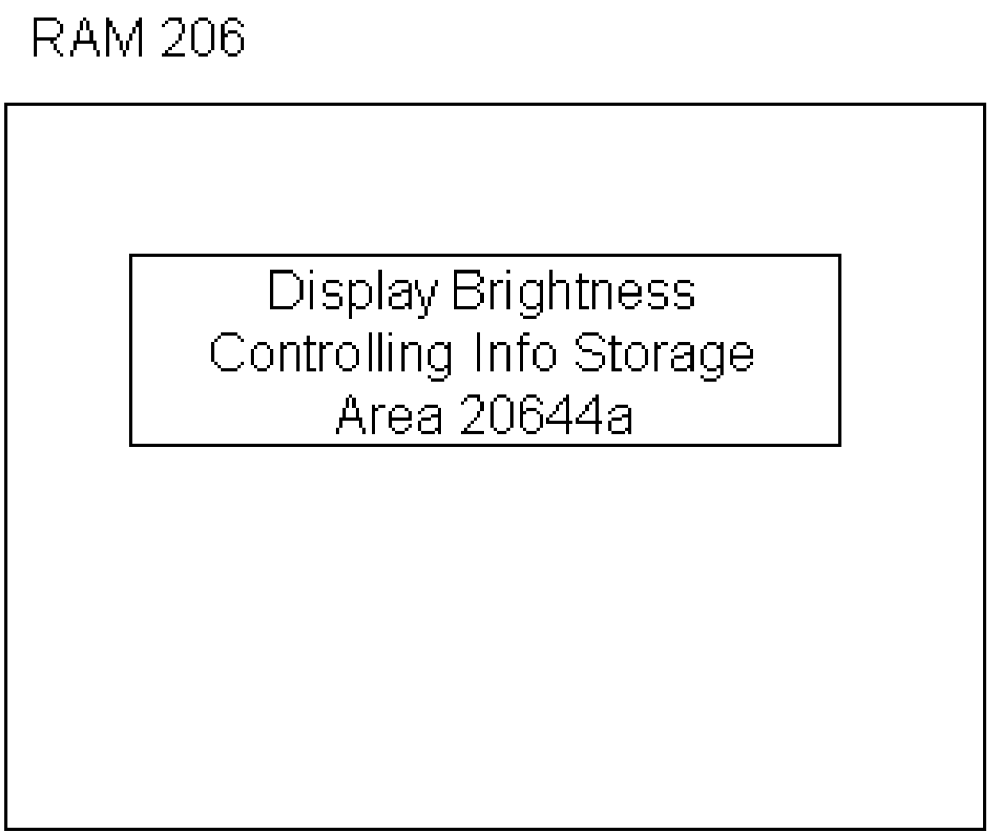

FIG. 918 is a block diagram illustrating an exemplary embodiment of the present invention.

Figure 919:
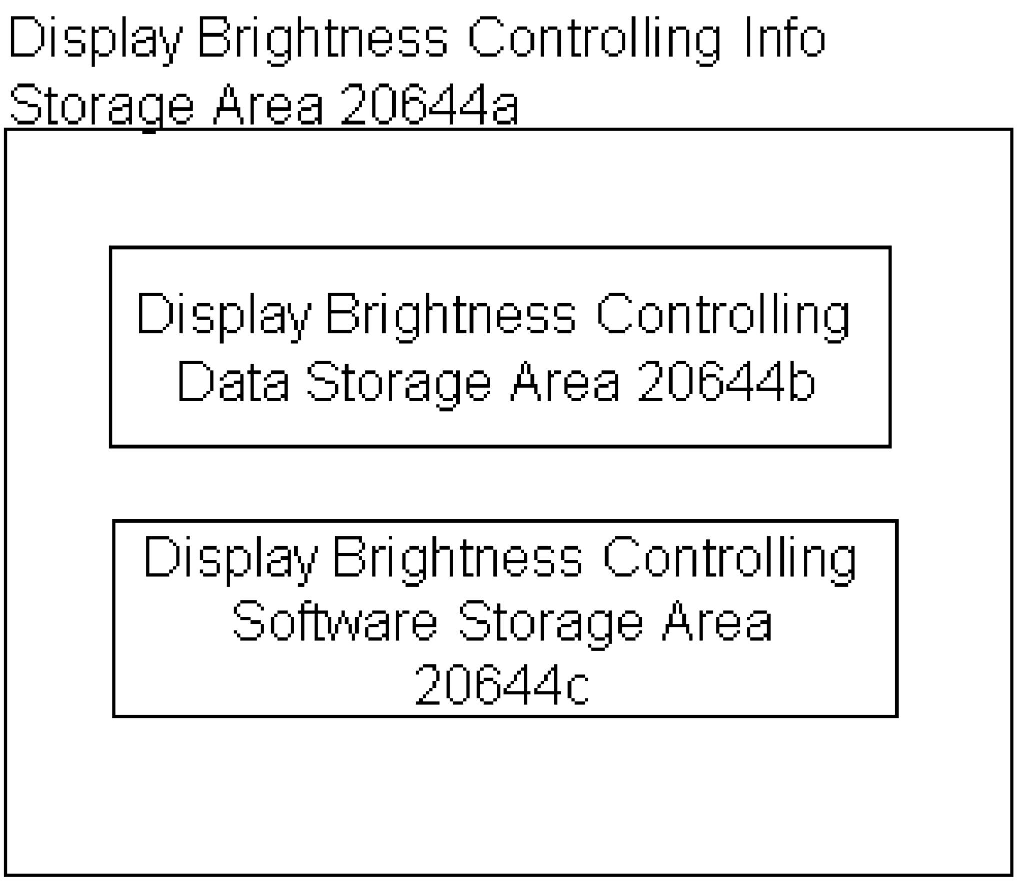

FIG. 919 is a block diagram illustrating an exemplary embodiment of the present invention.

FIG. 920 is a block diagram illustrating an exemplary embodiment of the present invention.

Figure 921:
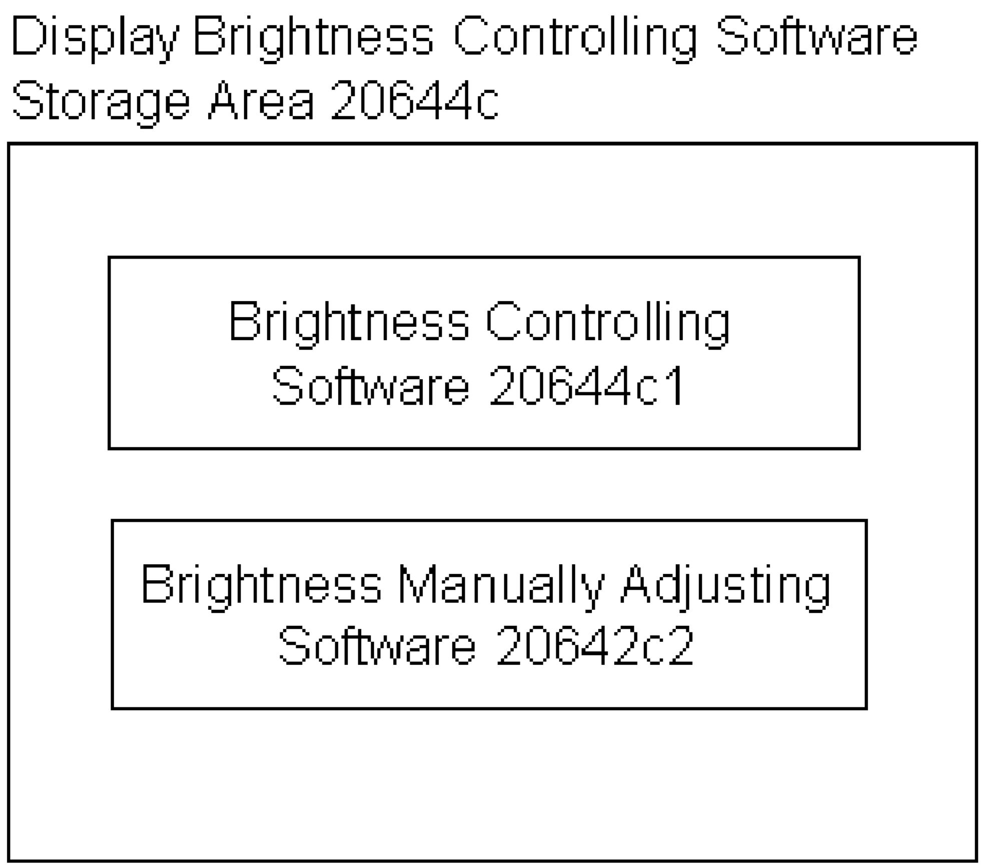

FIG. 921 is a block diagram illustrating an exemplary embodiment of the present invention.

Figure 922:
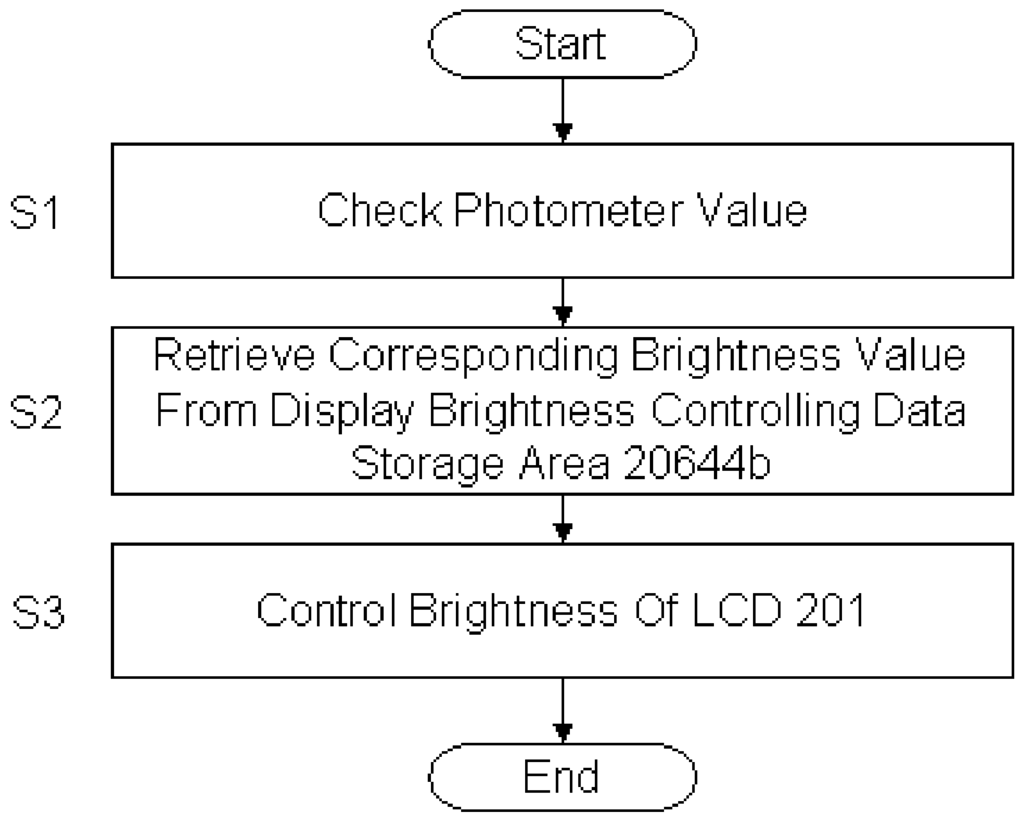

FIG. 922 is a flowchart illustrating an exemplary embodiment of the present invention.

Figure 923:
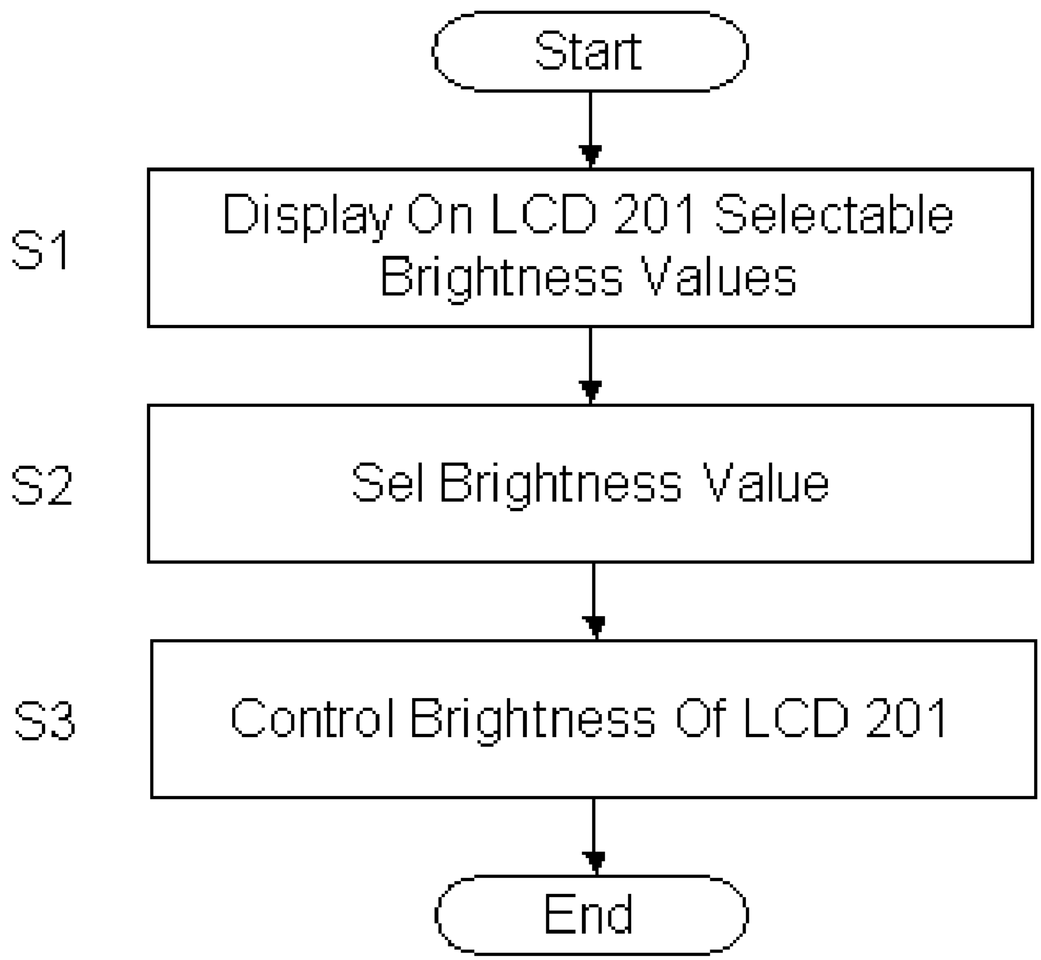

FIG. 923 is a flowchart illustrating an exemplary embodiment of the present invention.

Figure 924:
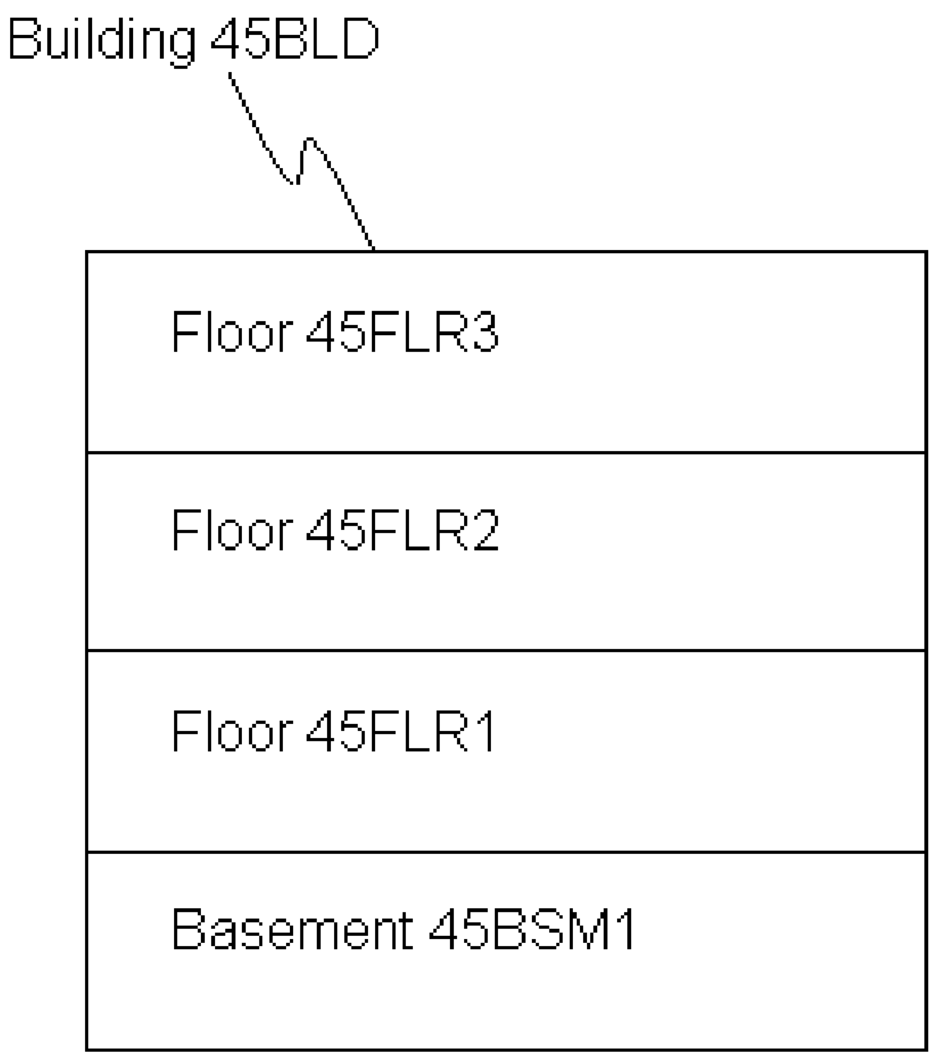

FIG. 924 is a simplified illustration illustrating an exemplary embodiment of the present invention.

Figure 925:
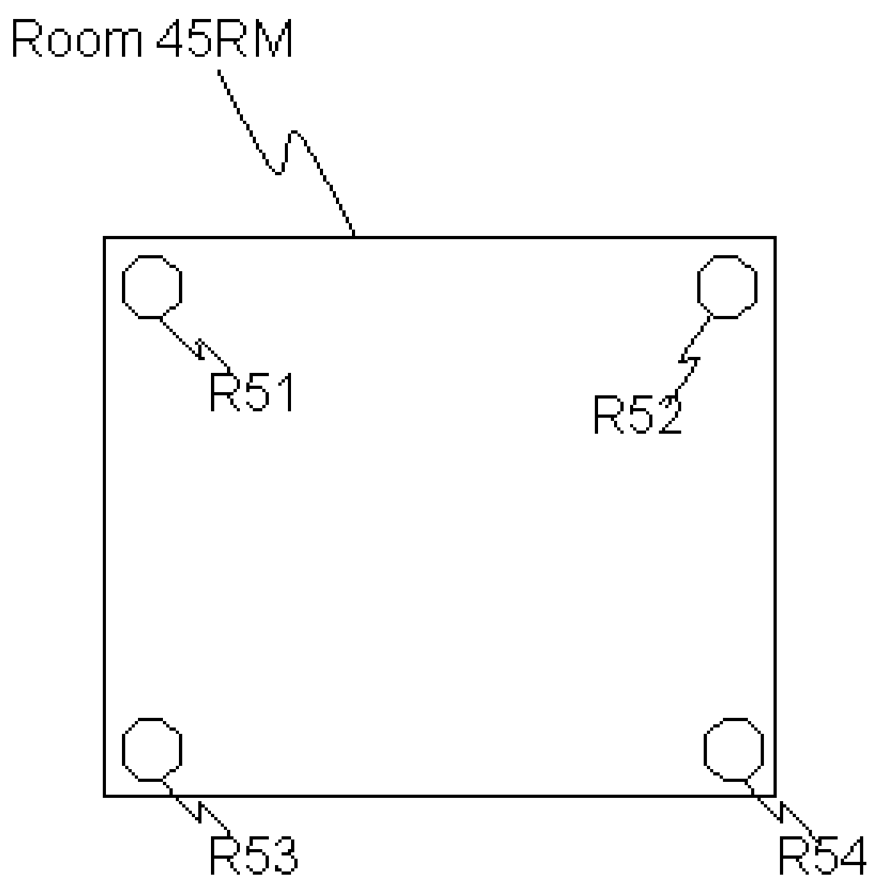

FIG. 925 is a simplified illustration illustrating an exemplary embodiment of the present invention.

Figure 926:
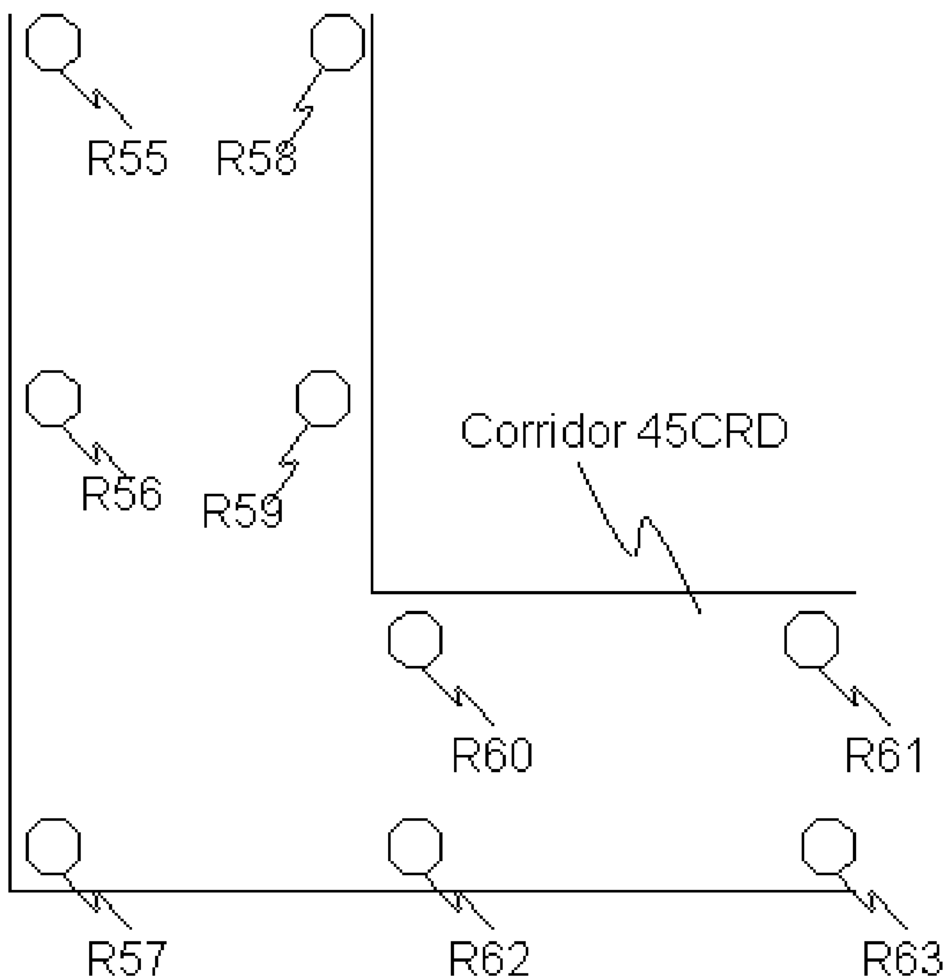

FIG. 926 is a simplified illustration illustrating an exemplary embodiment of the present invention.

Figure 927:
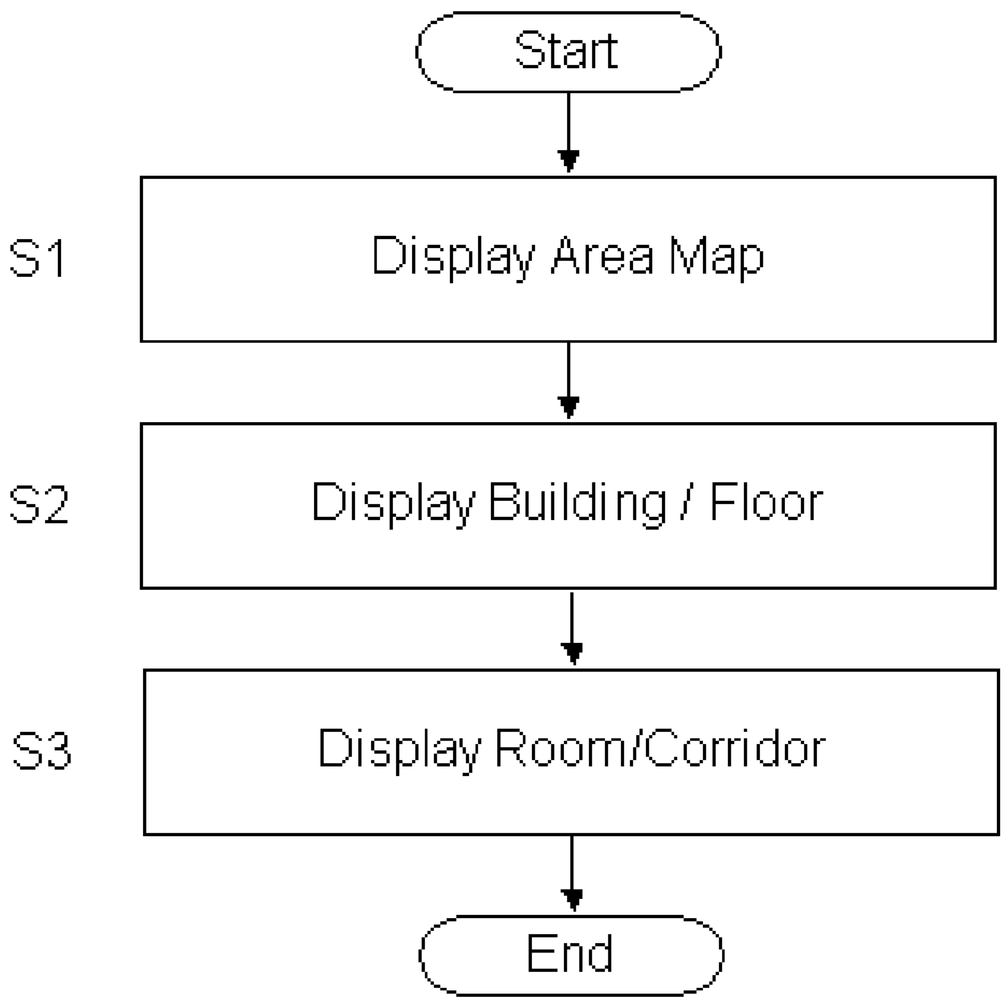

FIG. 927 is a simplified illustration illustrating an exemplary embodiment of the present invention.

Figure 928:
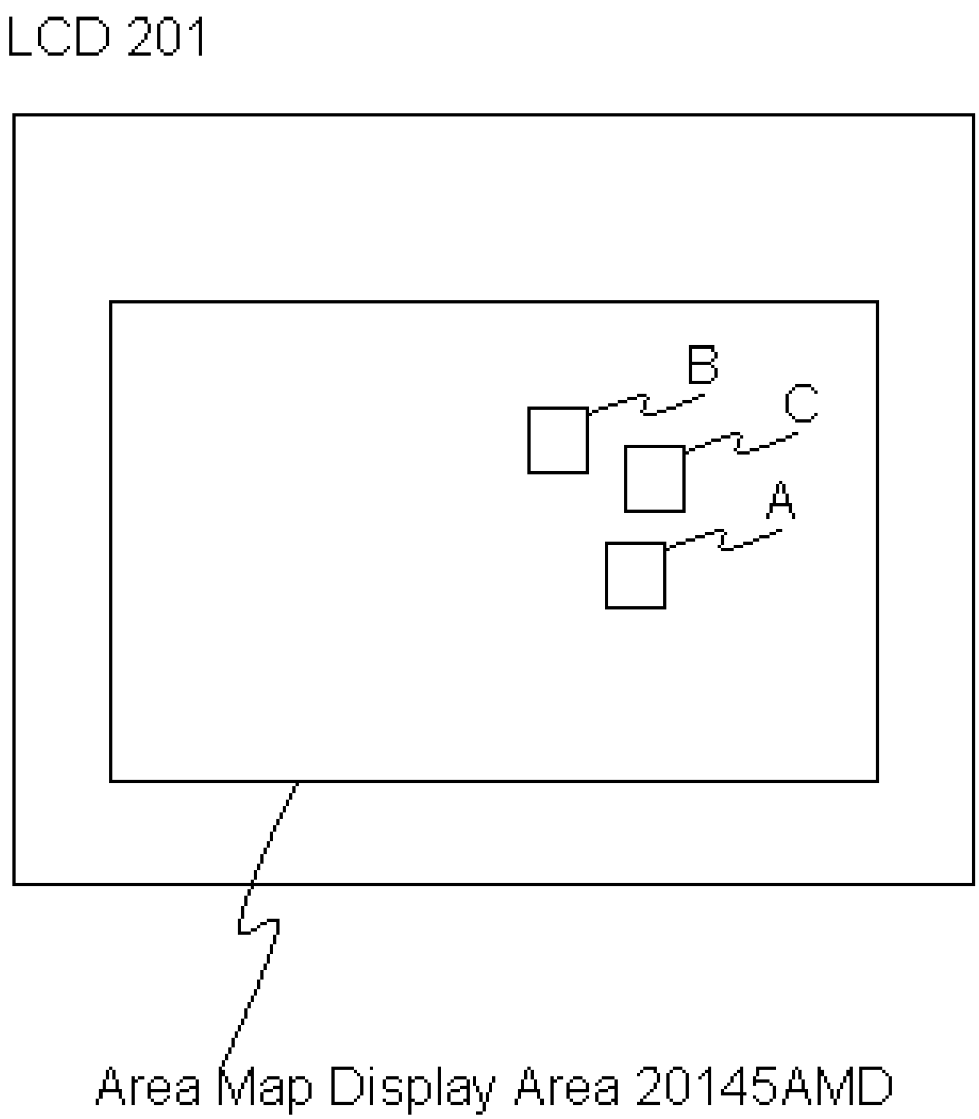

FIG. 928 is a simplified illustration illustrating an exemplary embodiment of the present invention.

Figure 929:
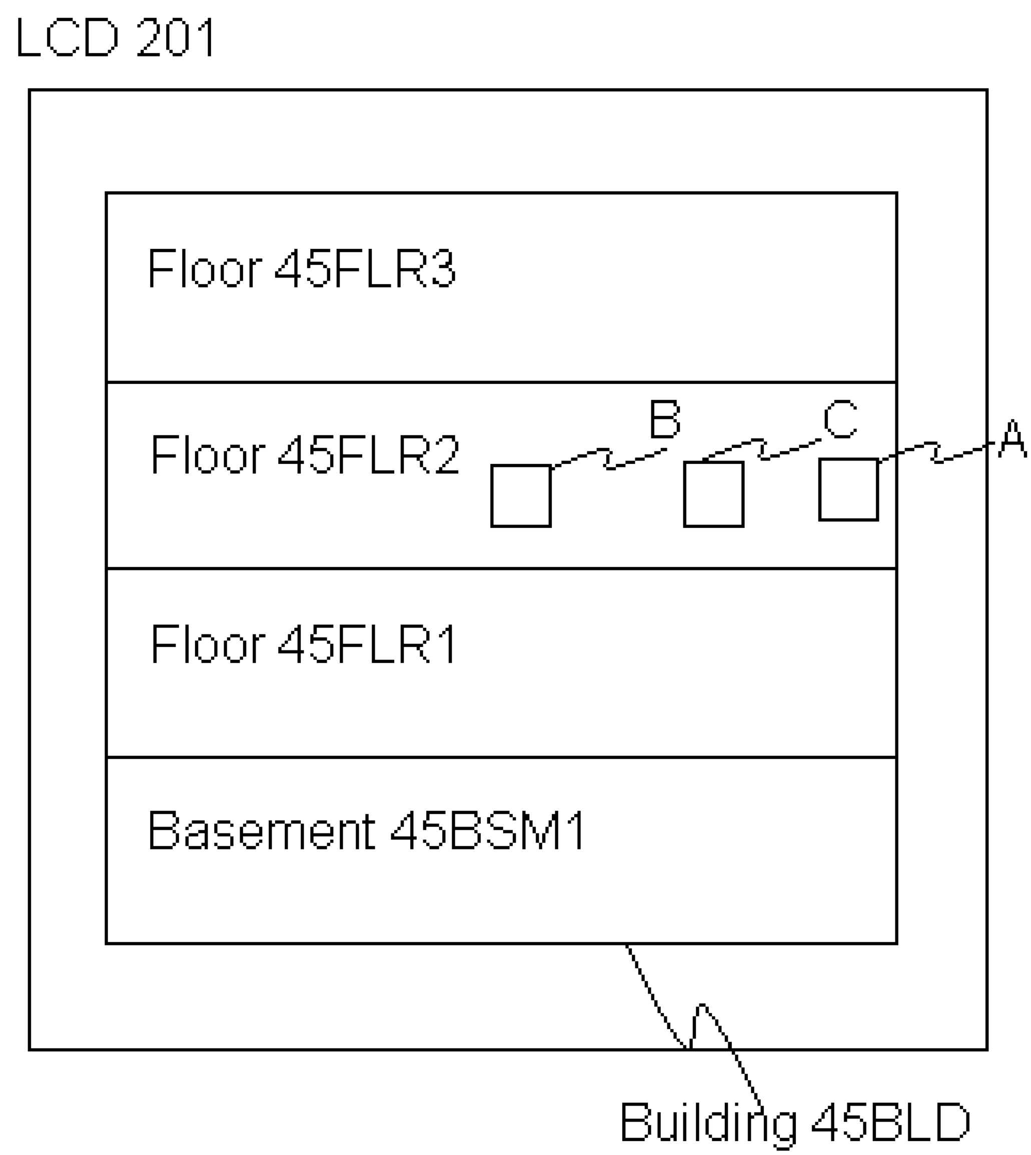

FIG. 929 is a simplified illustration illustrating an exemplary embodiment of the present invention.

Figure 930:
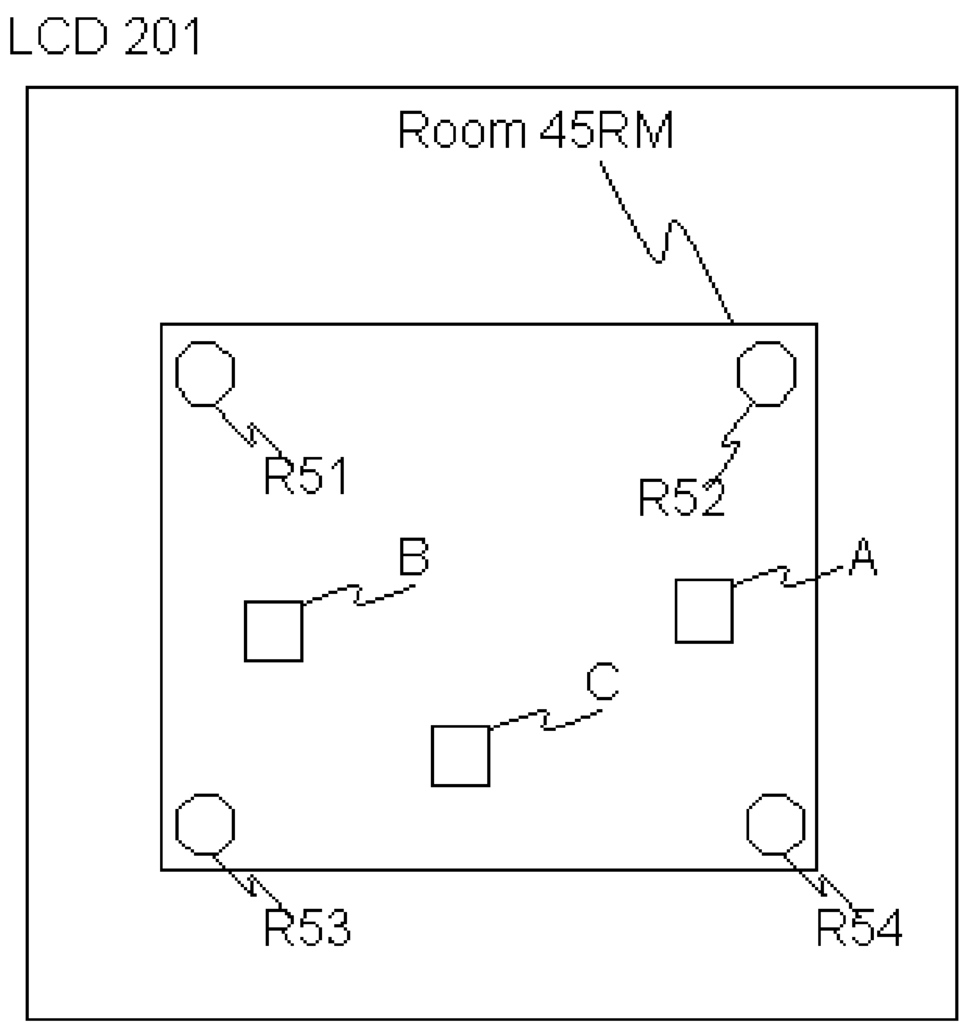

FIG. 930 is a simplified illustration illustrating an exemplary embodiment of the present invention.

Figure 931:
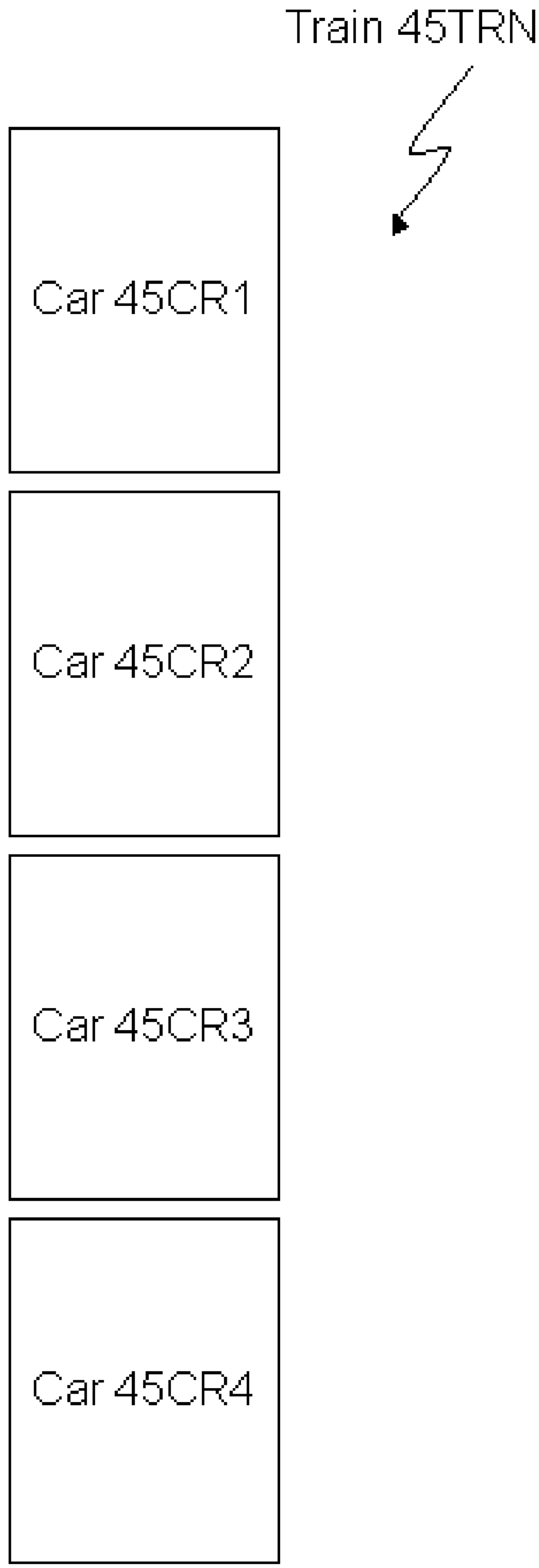

FIG. 931 is a simplified illustration illustrating an exemplary embodiment of the present invention.

Figure 932:
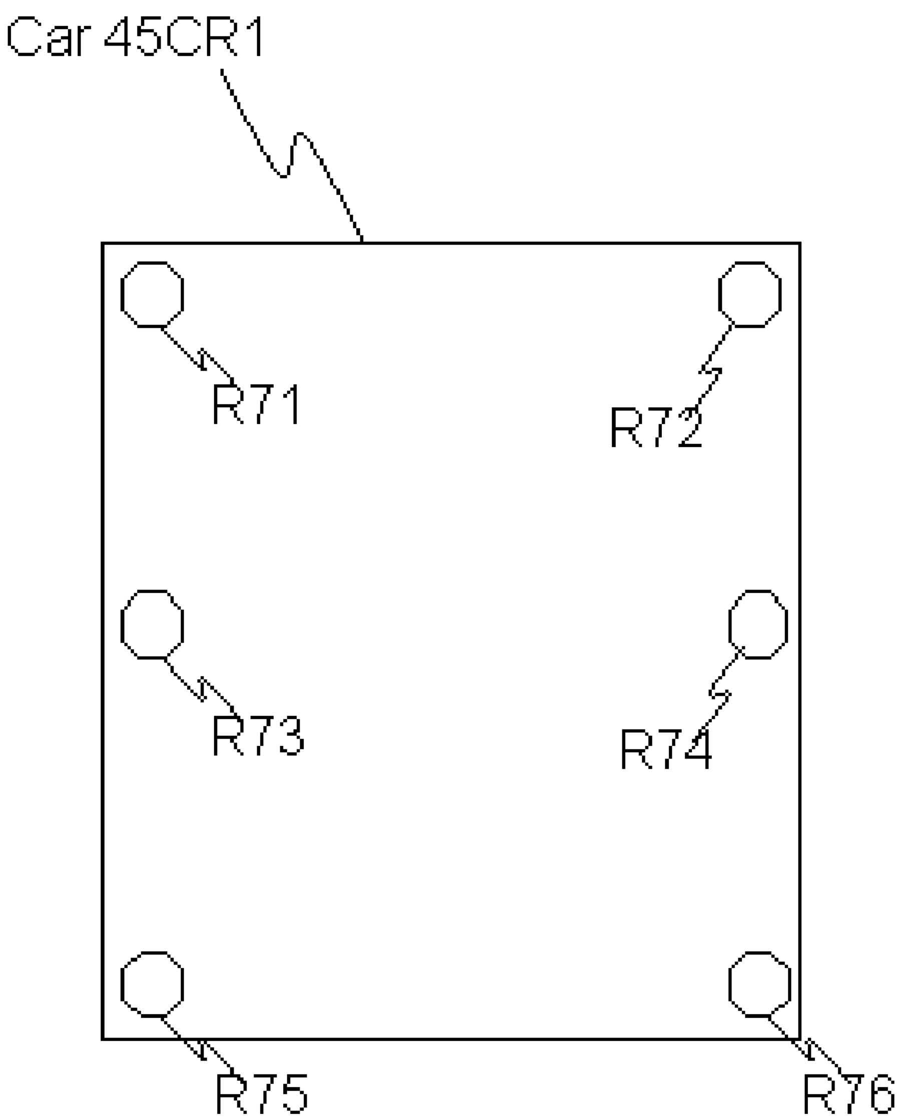

FIG. 932 is a simplified illustration illustrating an exemplary embodiment of the present invention.

Figure 933:
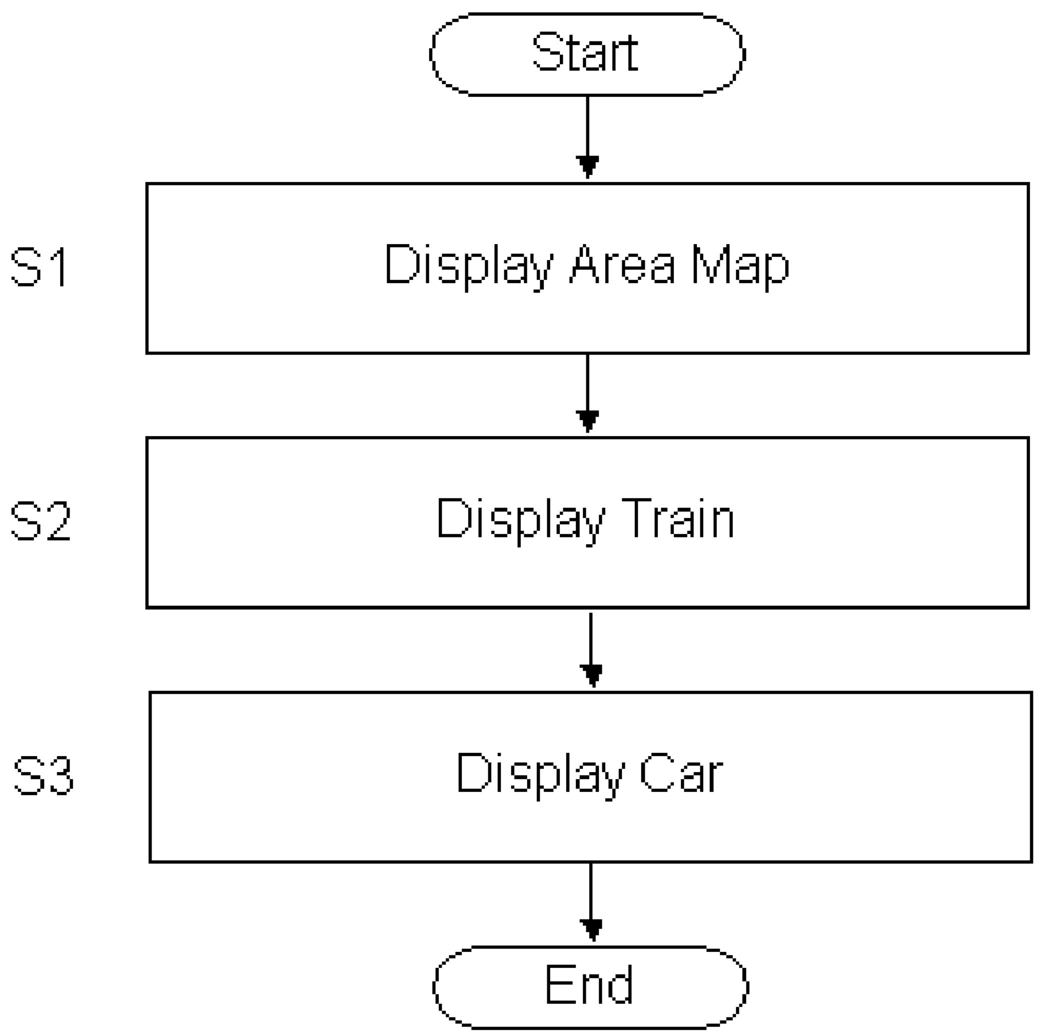

FIG. 933 is a simplified illustration illustrating an exemplary embodiment of the present invention.

Figure 934:
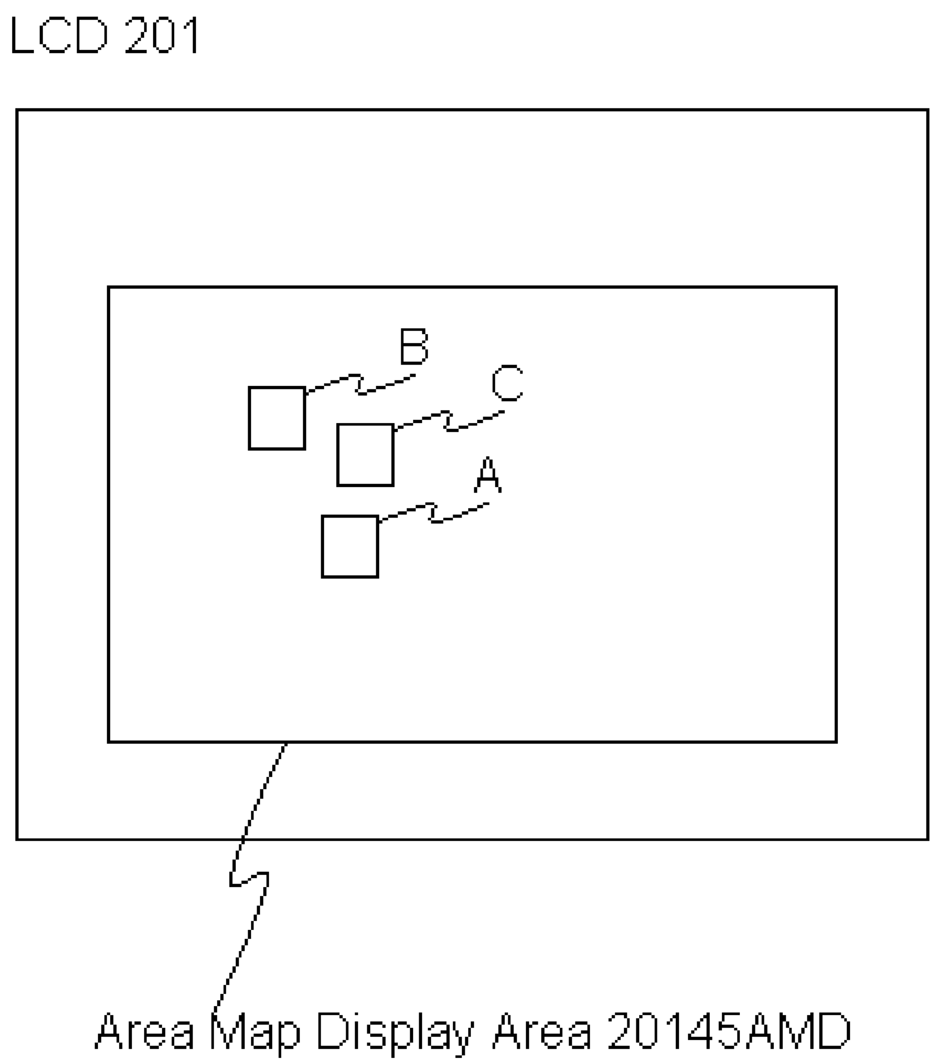

FIG. 934 is a simplified illustration illustrating an exemplary embodiment of the present invention.

Figure 935:
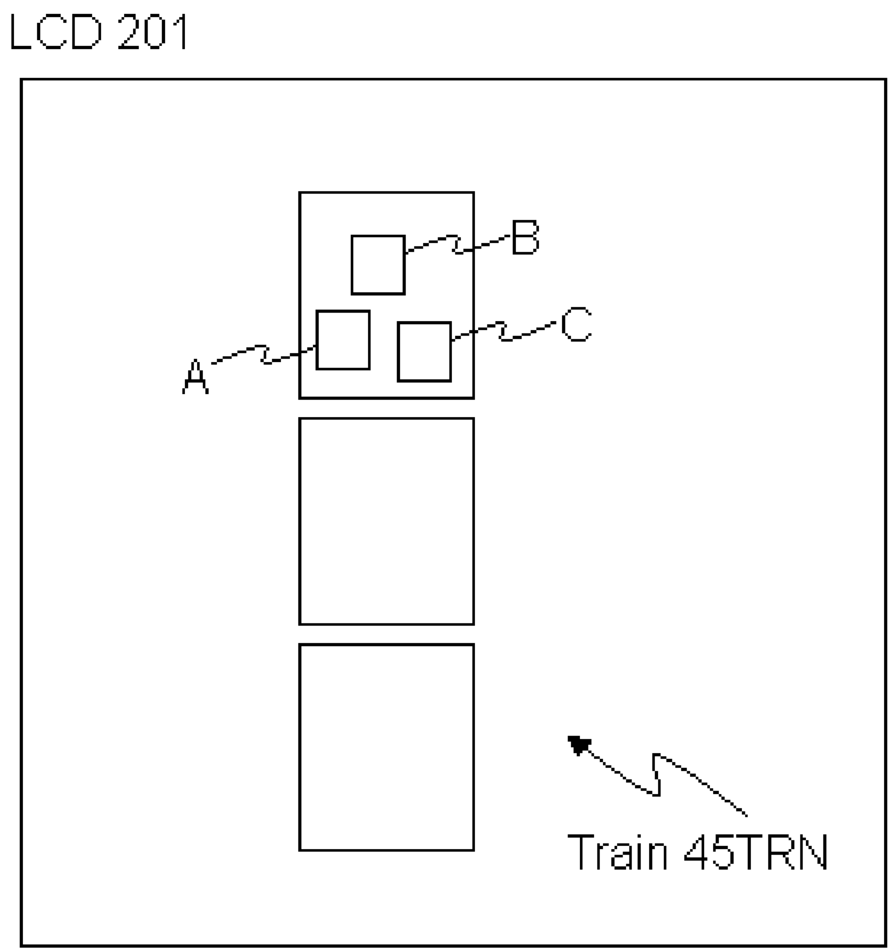

FIG. 935 is a simplified illustration illustrating an exemplary embodiment of the present invention.

Figure 936:
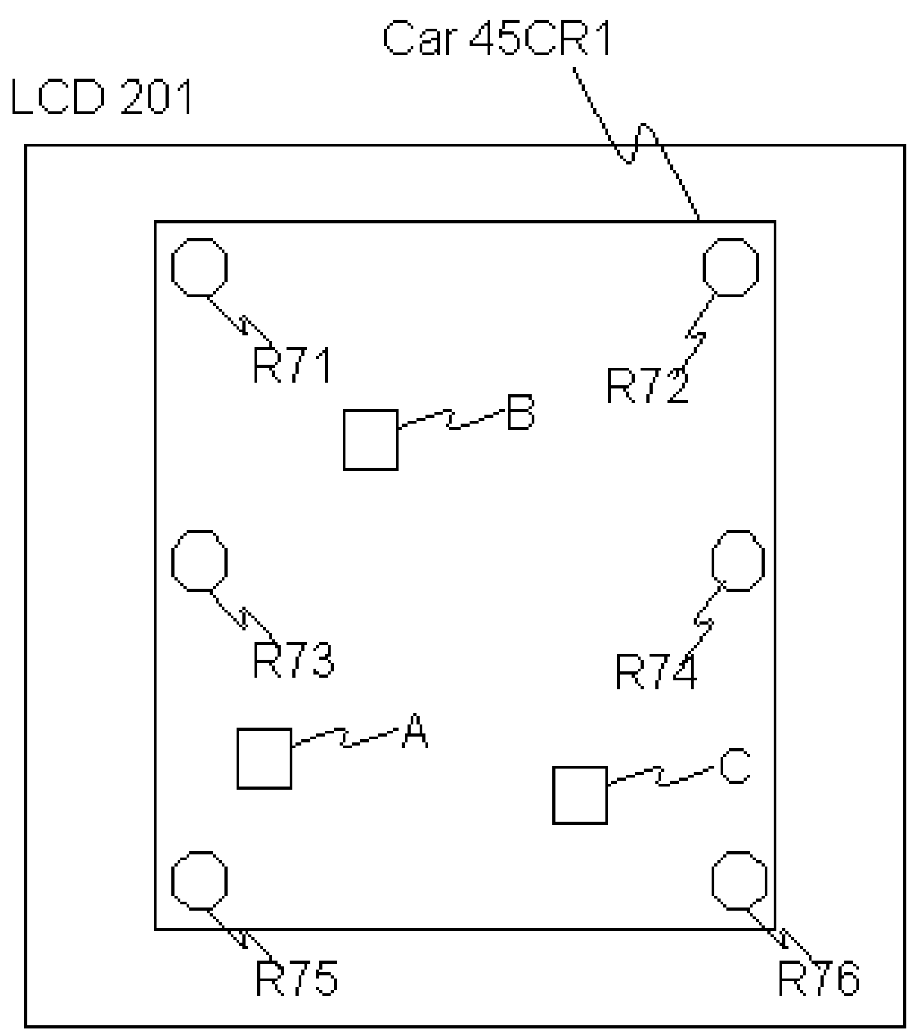

FIG. 936 is a block diagram illustrating an exemplary embodiment of the present invention.

Figure 937:
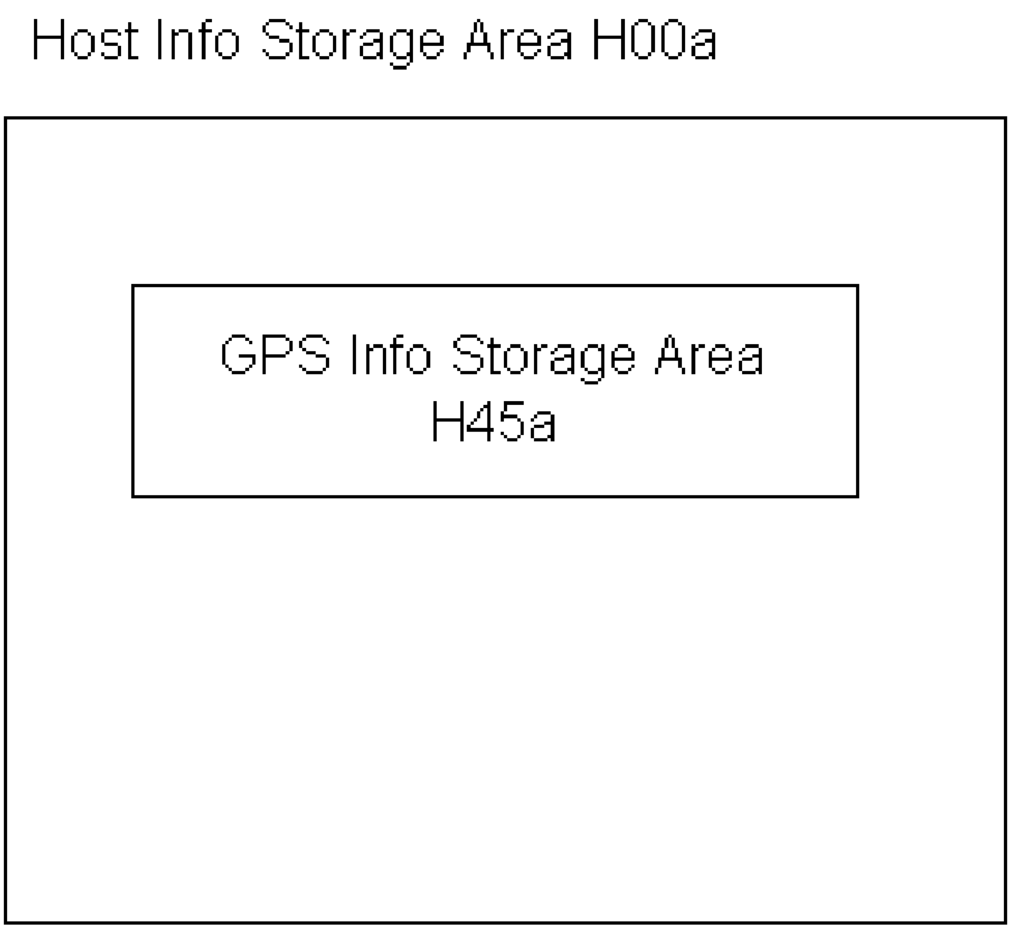

FIG. 937 is a block diagram illustrating an exemplary embodiment of the present invention.

Figure 938:
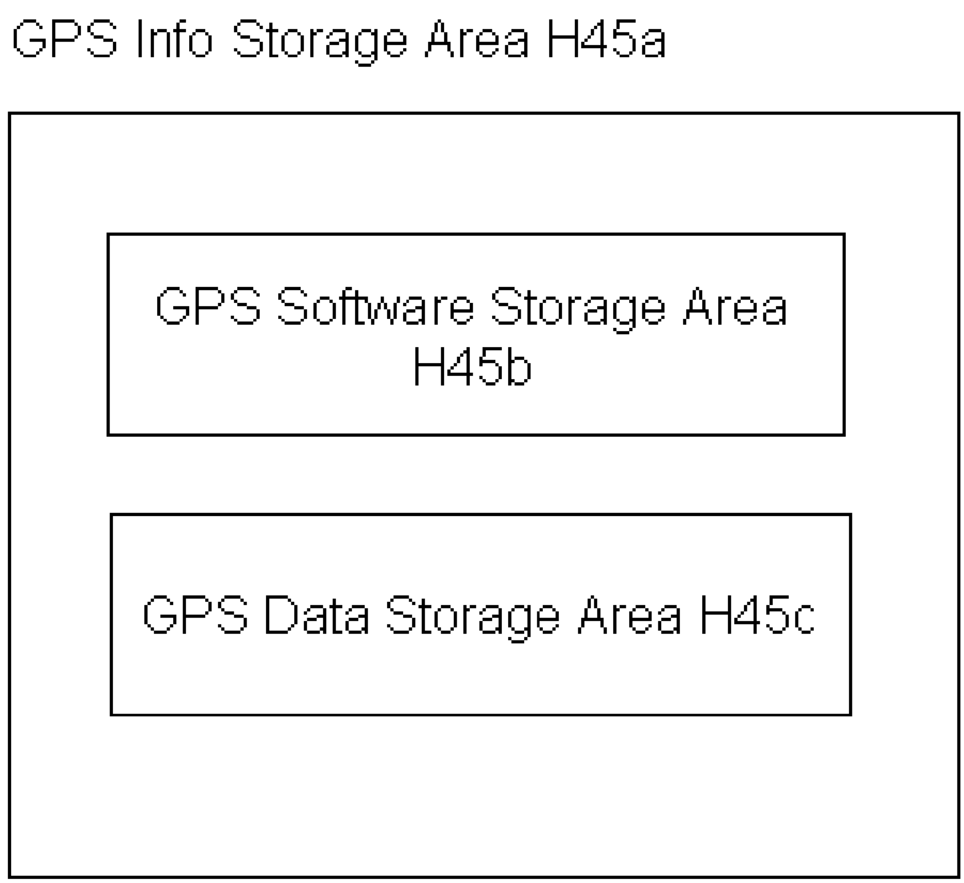

FIG. 938 is a block diagram illustrating an exemplary embodiment of the present invention.

Figure 939:
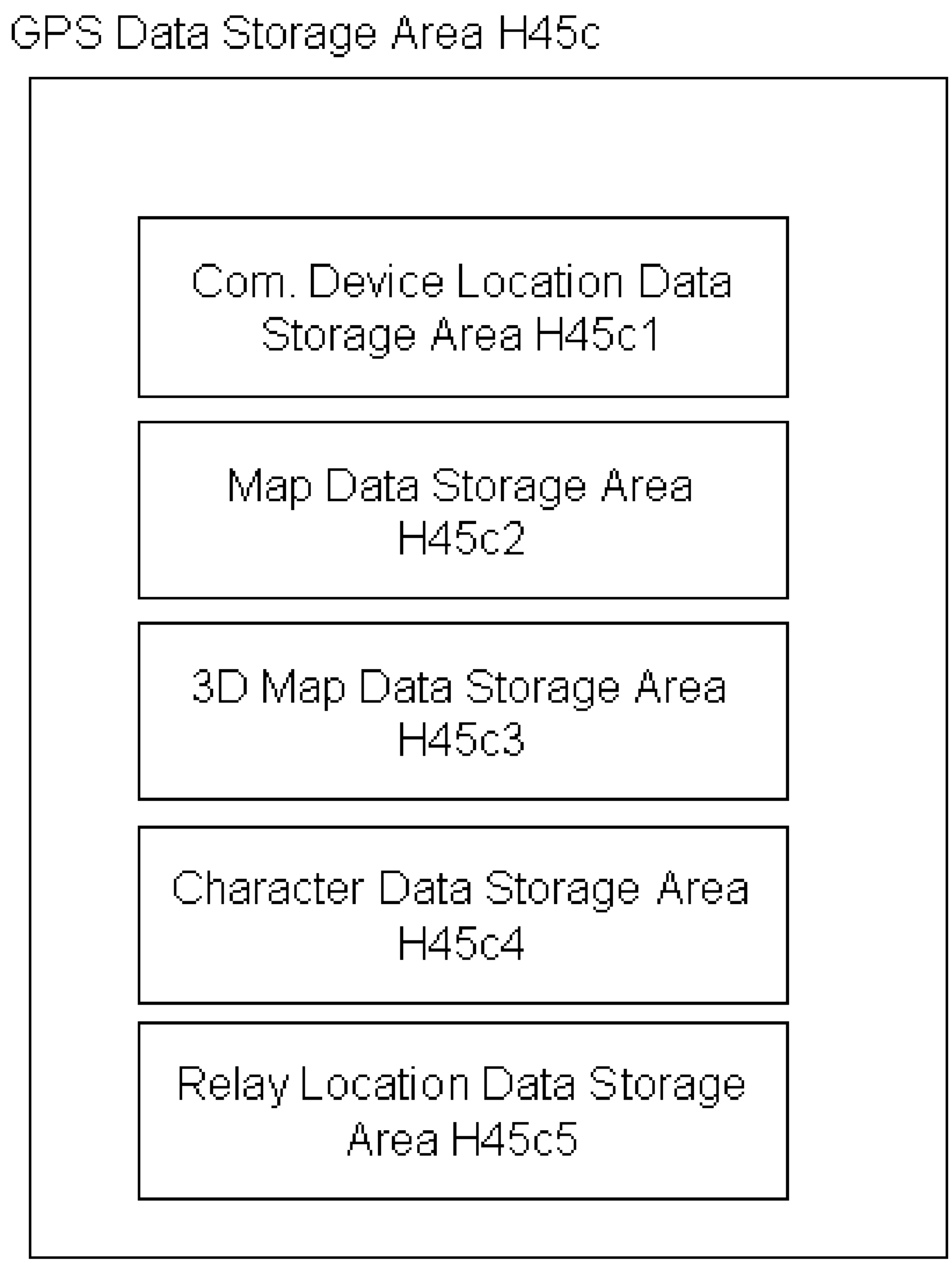

FIG. 939 is a block diagram illustrating an exemplary embodiment of the present invention.

FIG. 939*a* is a block diagram illustrating an exemplary embodiment of the present invention.

Figure 940:
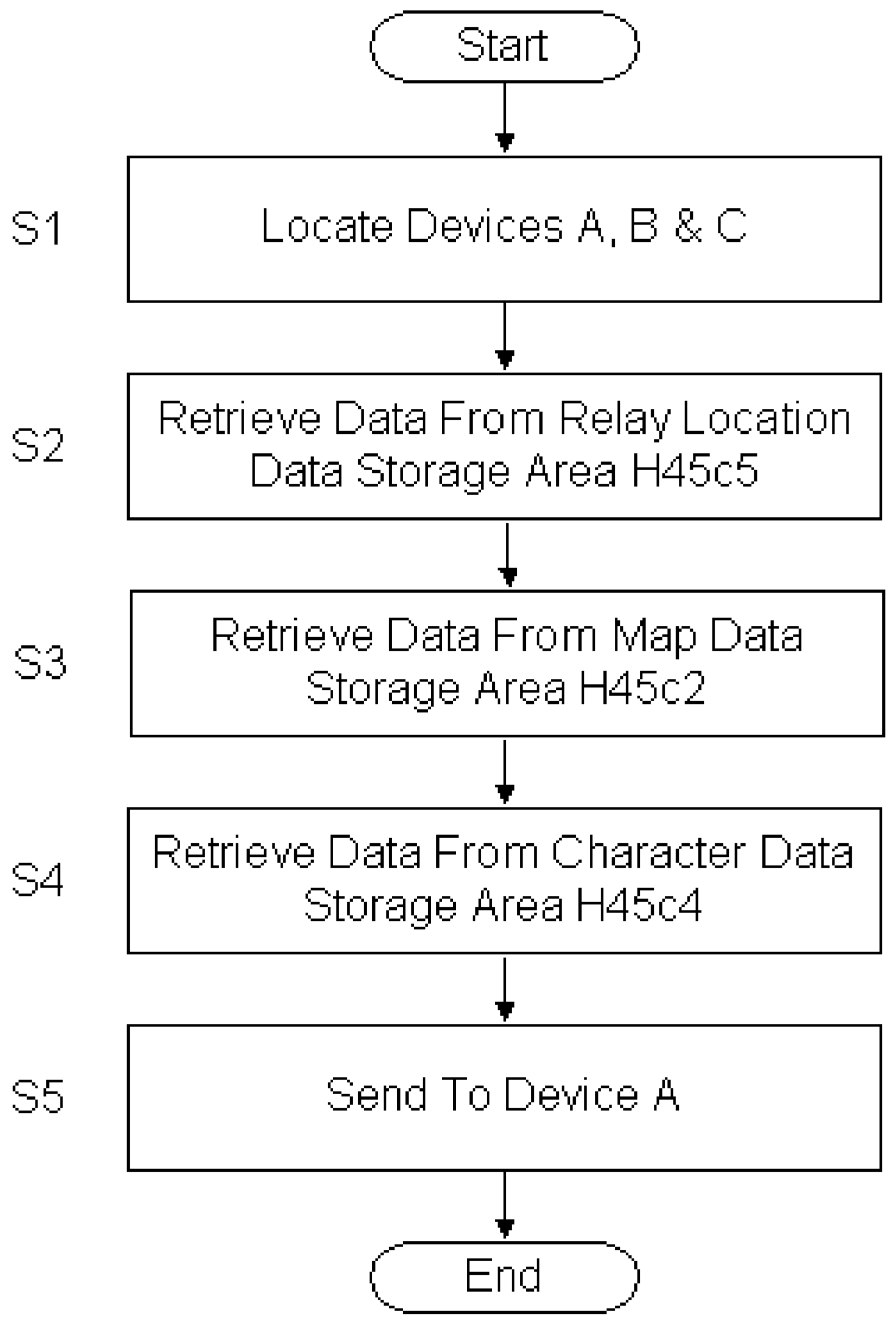

FIG. 940 is a flowchart illustrating an exemplary embodiment of the present invention.

Figure 941:
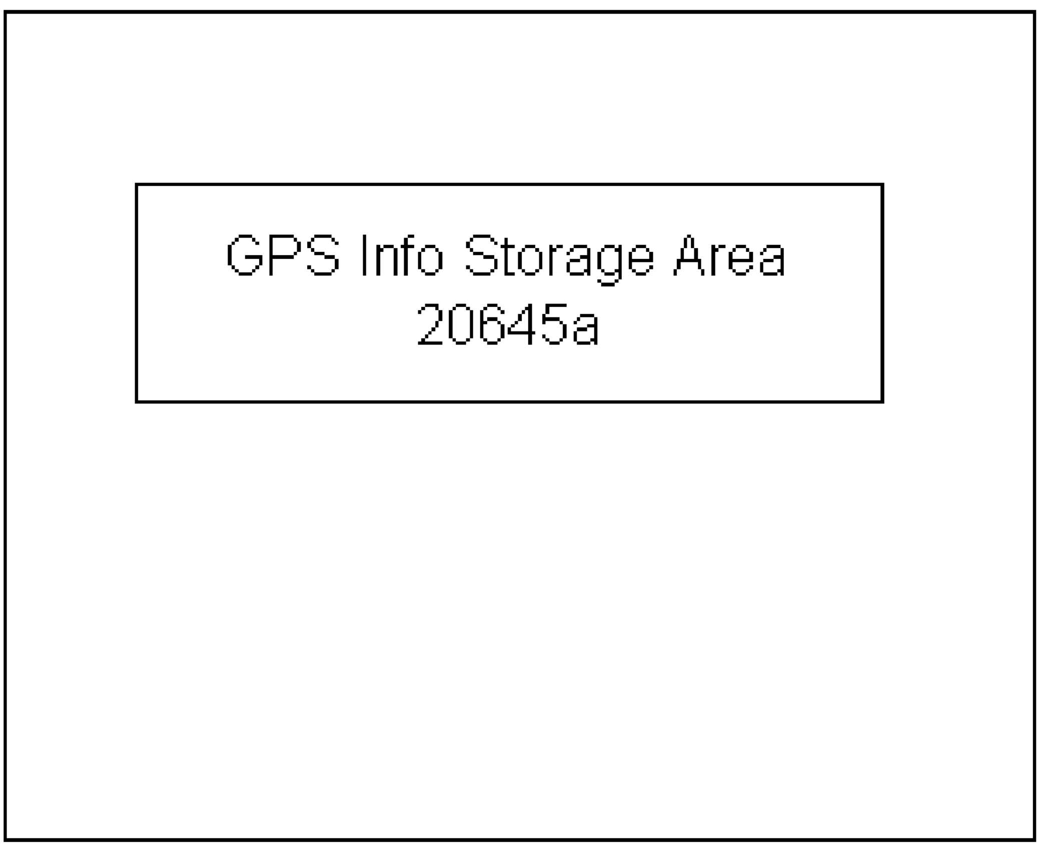

FIG. 941 is a block diagram illustrating an exemplary embodiment of the present invention.

Figure 942:
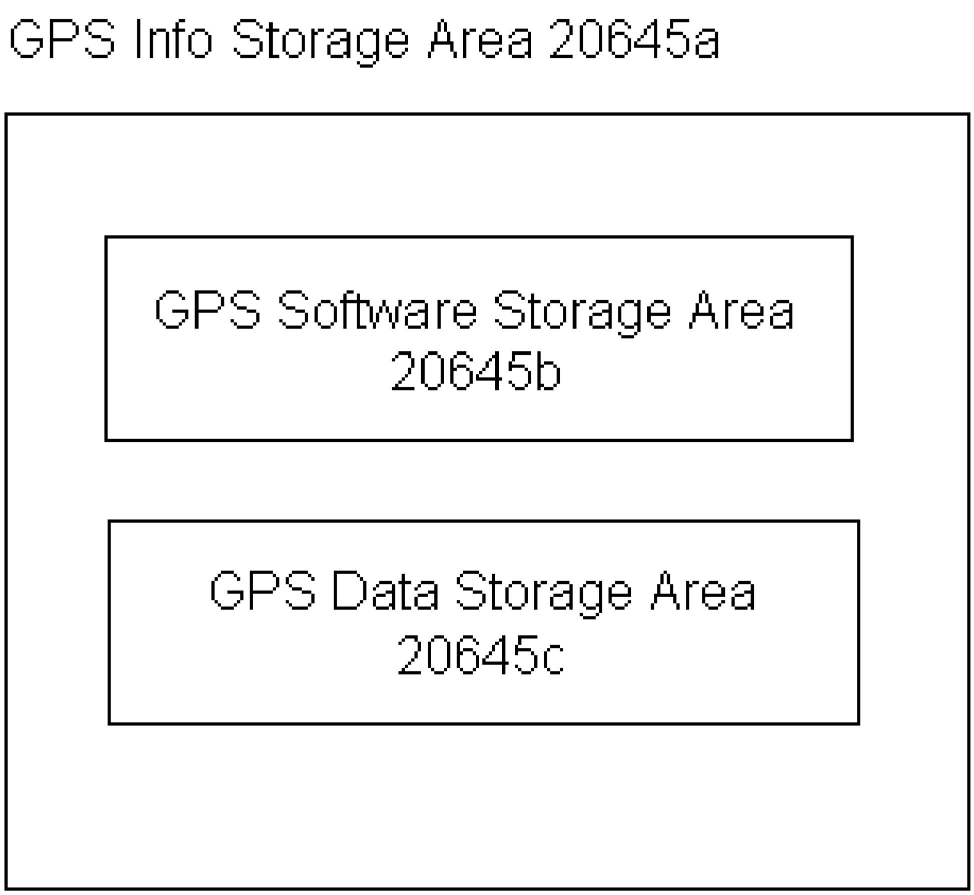

FIG. 942 is a block diagram illustrating an exemplary embodiment of the present invention.

Figure 943:
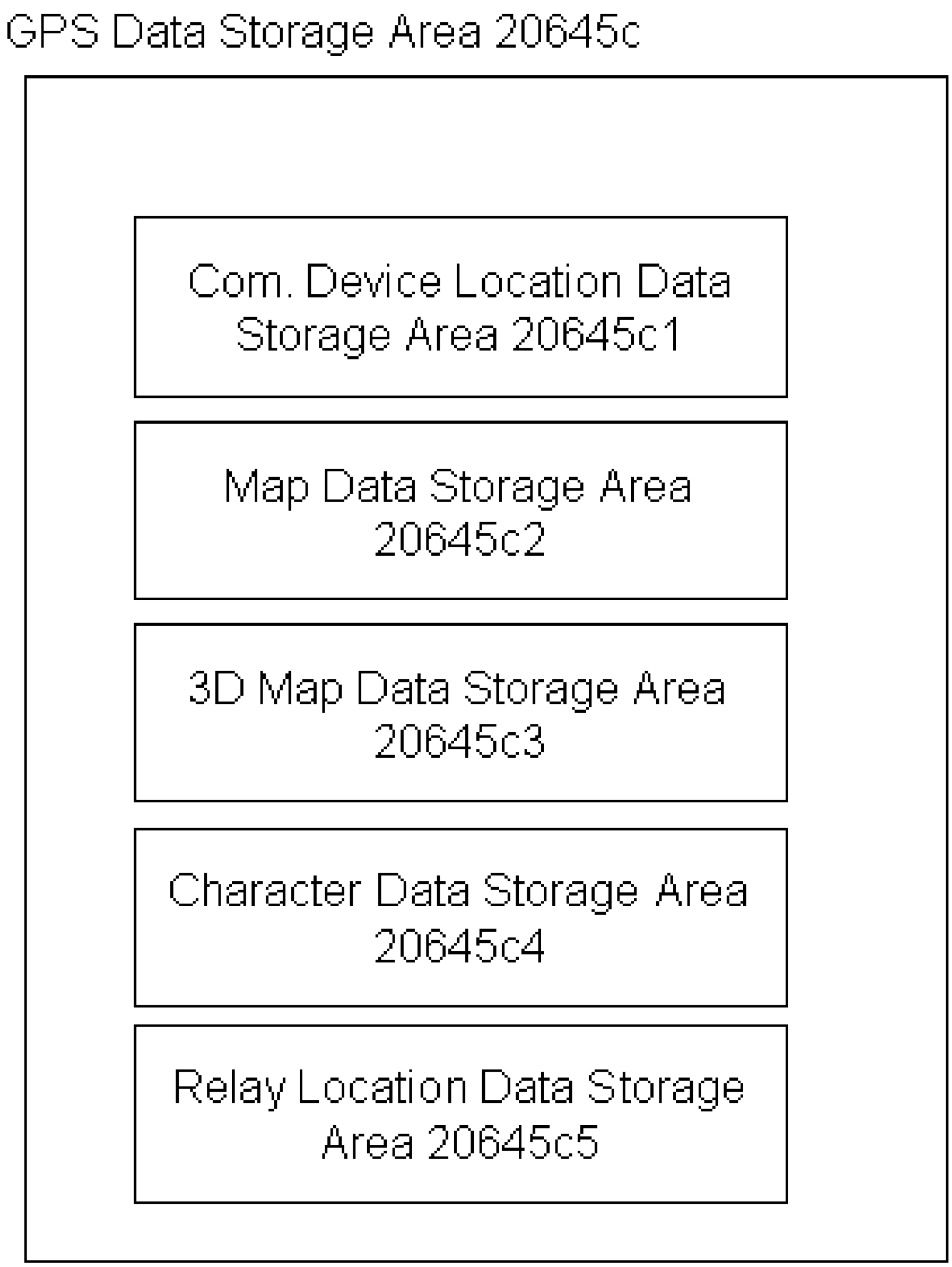

FIG. 943 is a block diagram illustrating an exemplary embodiment of the present invention.

FIG. 943*a* is a flowchart illustrating an exemplary embodiment of the present invention.

Figure 943B:
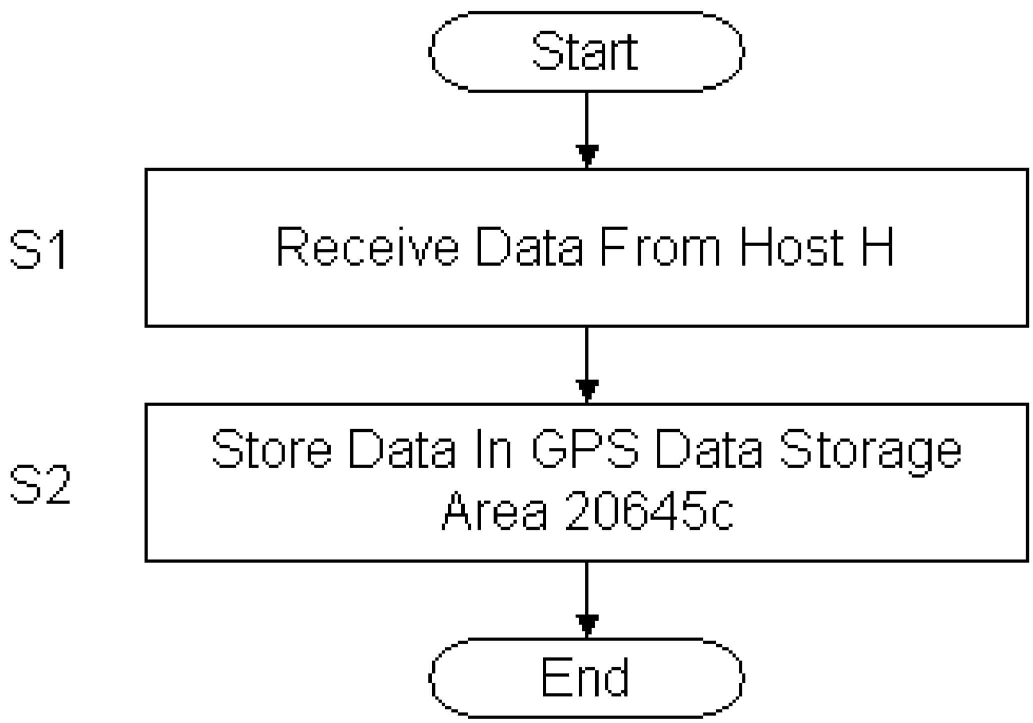

FIG. 943*b* is a flowchart illustrating an exemplary embodiment of the present invention.

Figure 944:
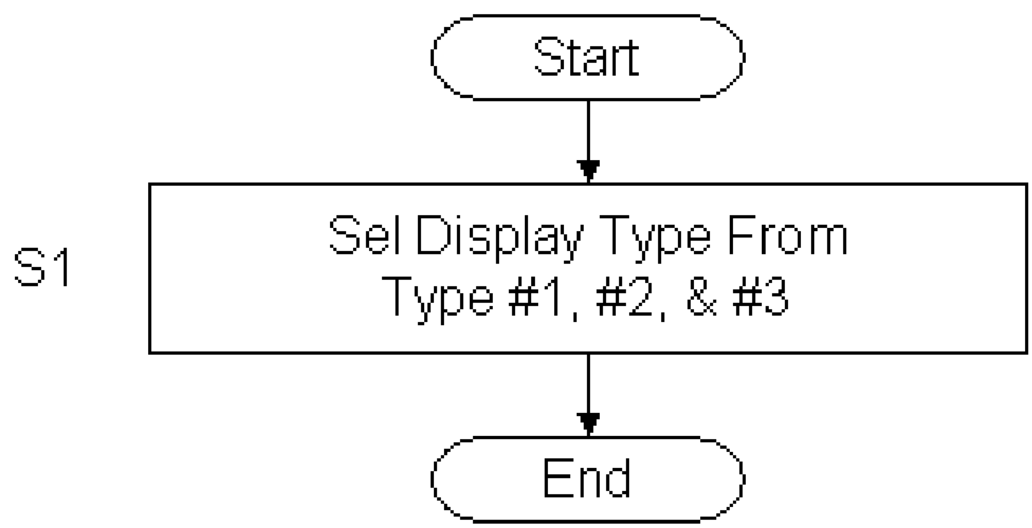

FIG. 944 is a flowchart illustrating an exemplary embodiment of the present invention.

Figure 945:
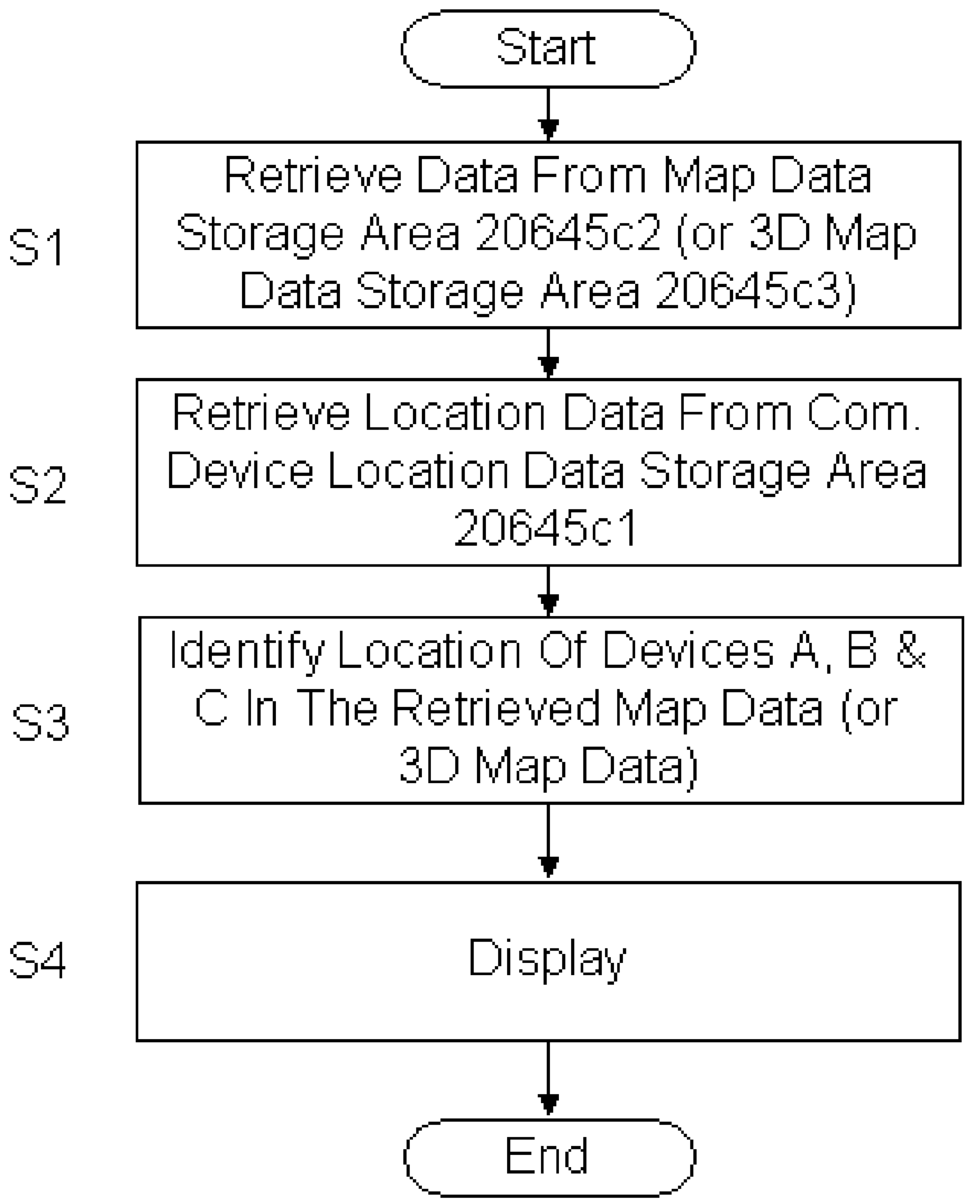

FIG. 945 is a flowchart illustrating an exemplary embodiment of the present invention.

Figure 946:
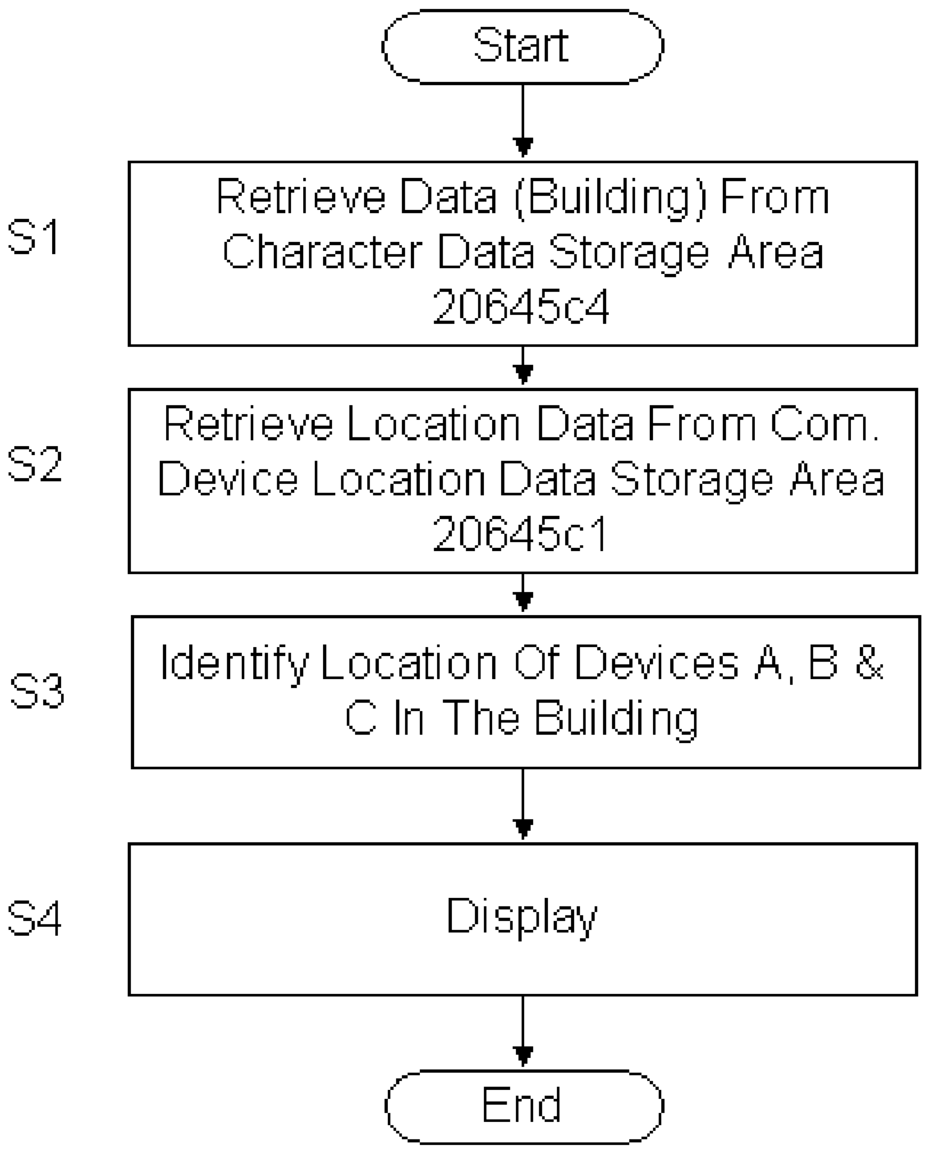

FIG. 946 is a flowchart illustrating an exemplary embodiment of the present invention.

Figure 947:
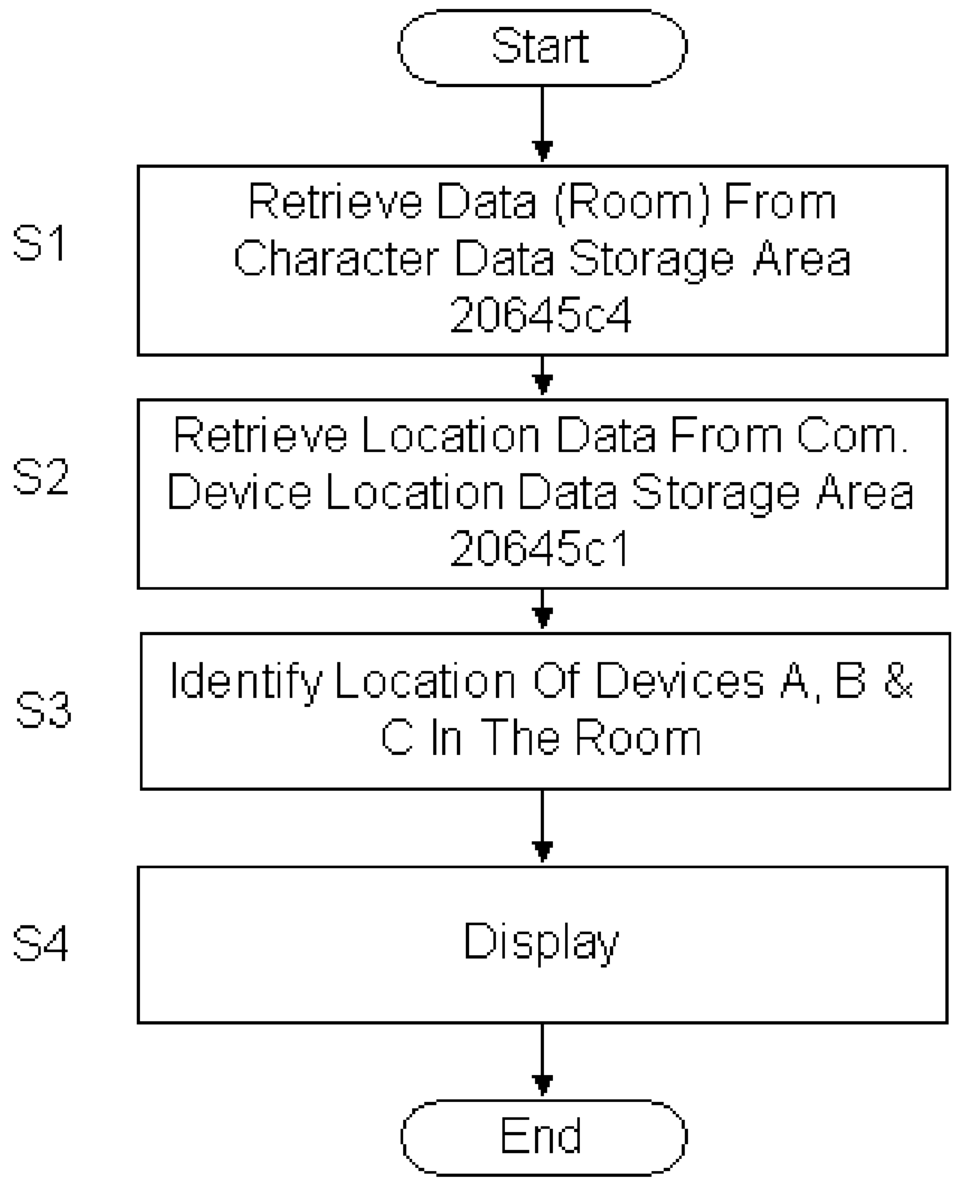

FIG. 947 is a flowchart illustrating an exemplary embodiment of the present invention.

Figure 948:
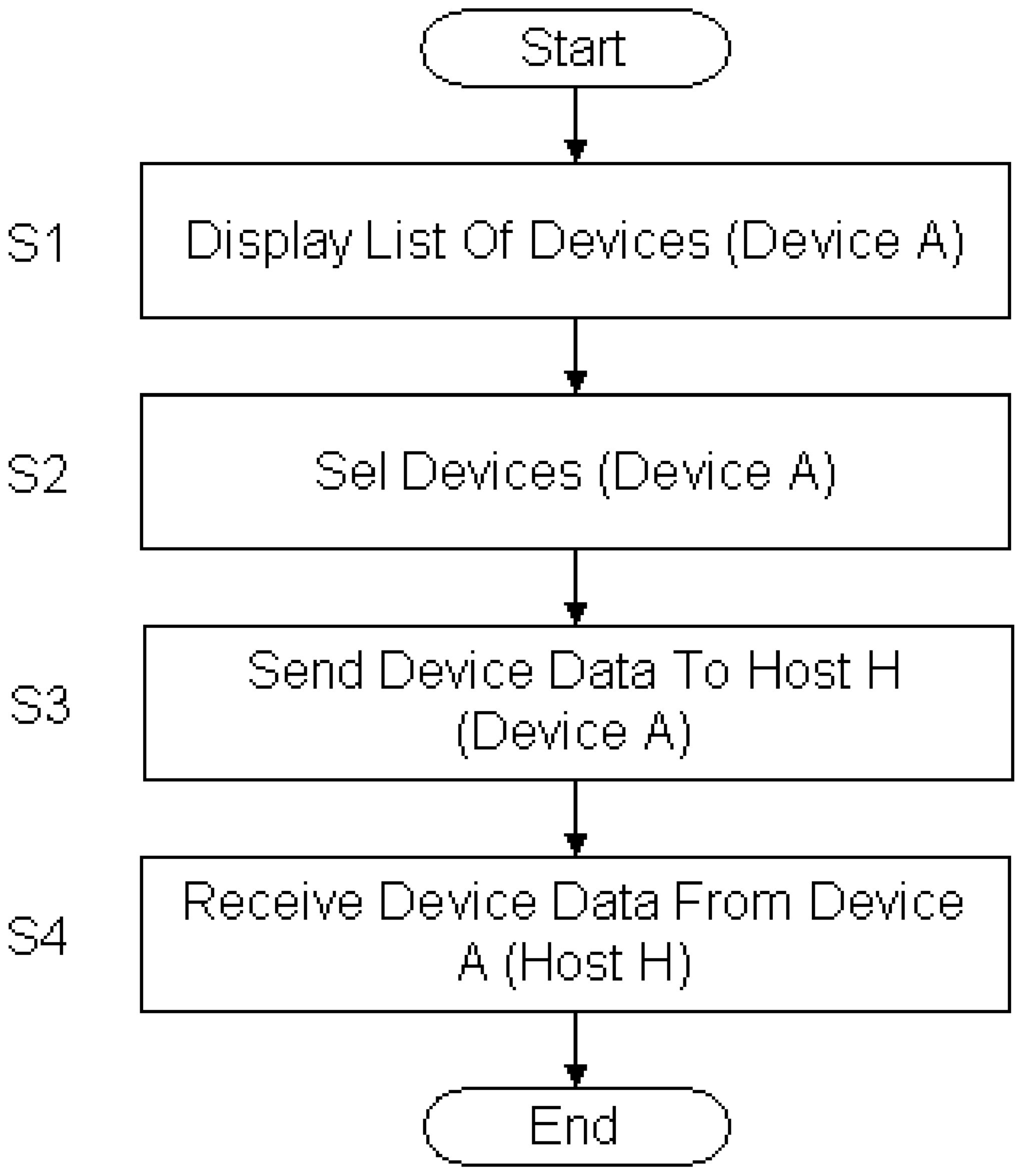

FIG. 948 is a flowchart illustrating an exemplary embodiment of the present invention.

Figure 949:
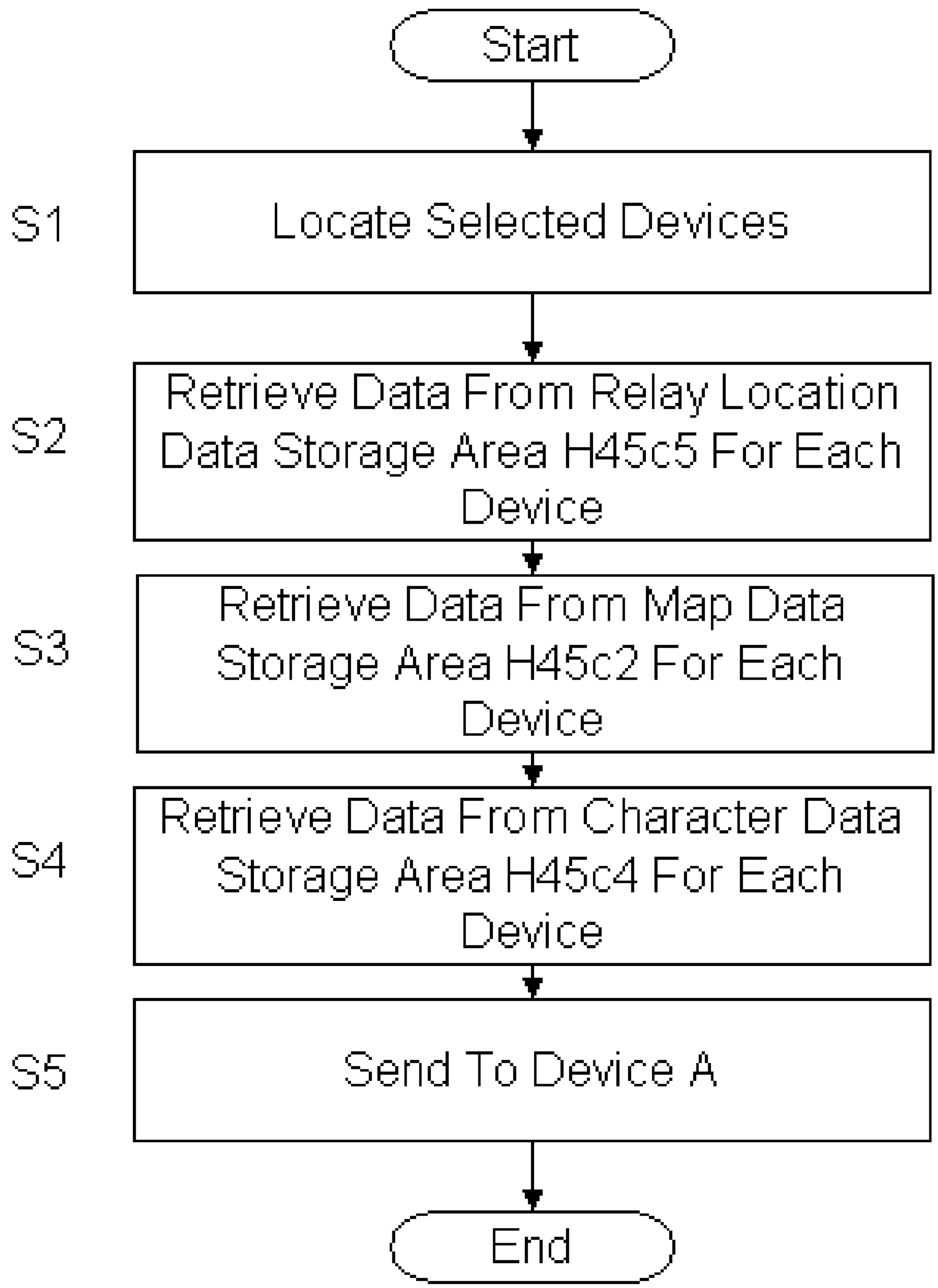

FIG. 949 is a flowchart illustrating an exemplary embodiment of the present invention.

Figure 949A:
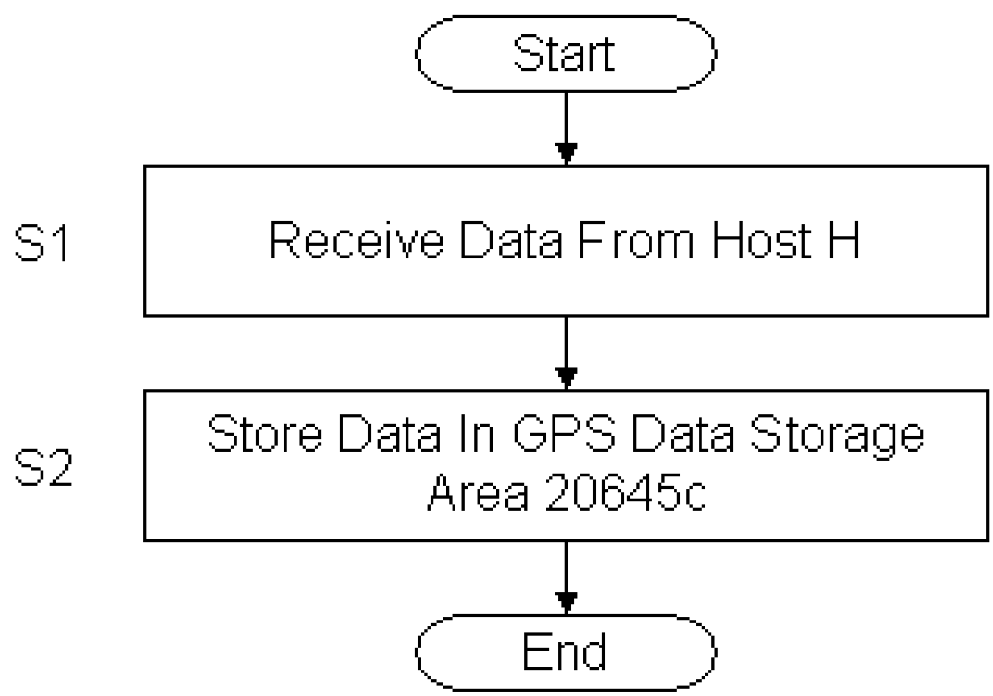

FIG. 949*a* is a flowchart illustrating an exemplary embodiment of the present invention.

Figure 950:
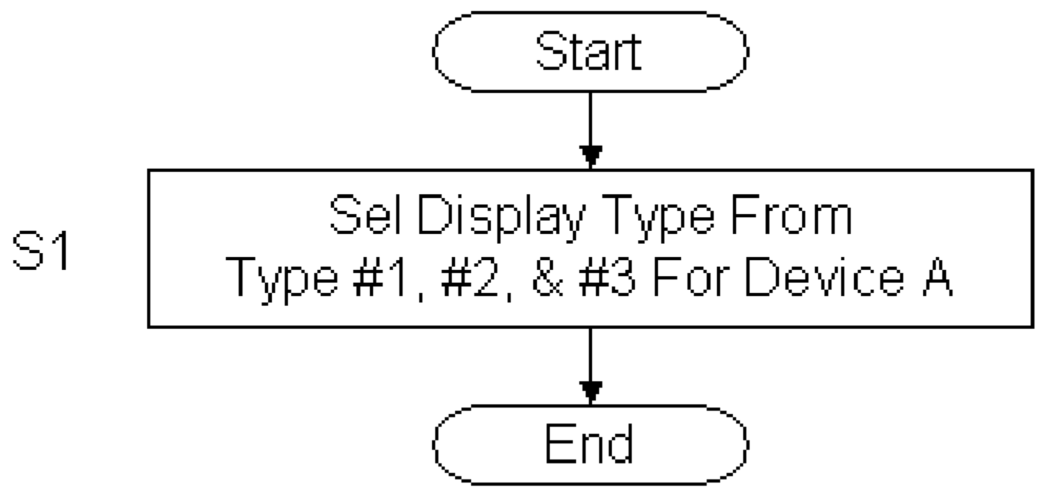

FIG. 950 is a flowchart illustrating an exemplary embodiment of the present invention.

Figure 950A:
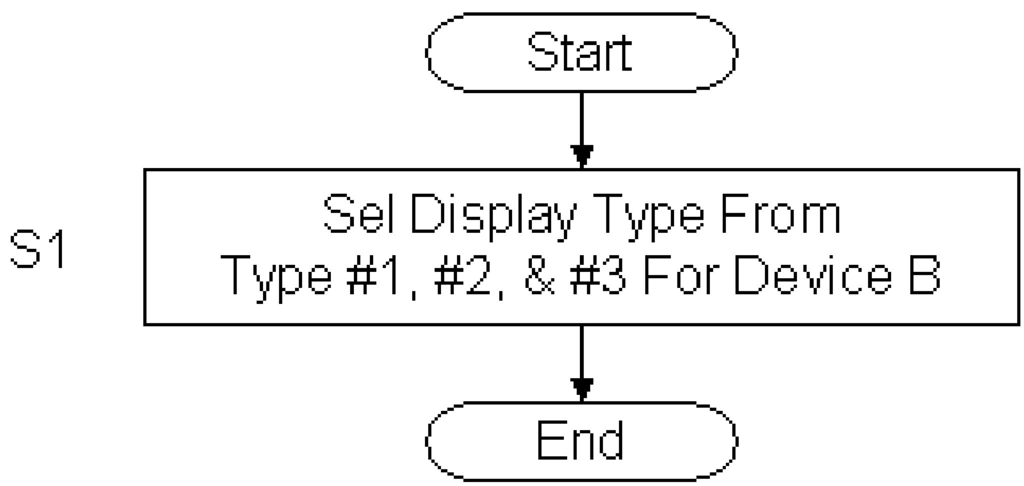

FIG. 950*a* is a flowchart illustrating an exemplary embodiment of the present invention.

Figure 950B:
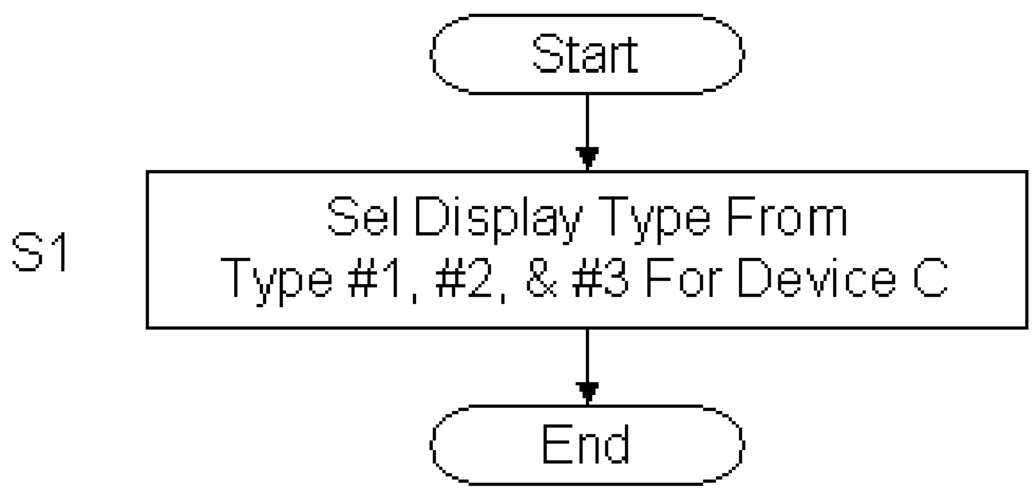

FIG. 950*b* is a flowchart illustrating an exemplary embodiment of the present invention.

Figure 950C:
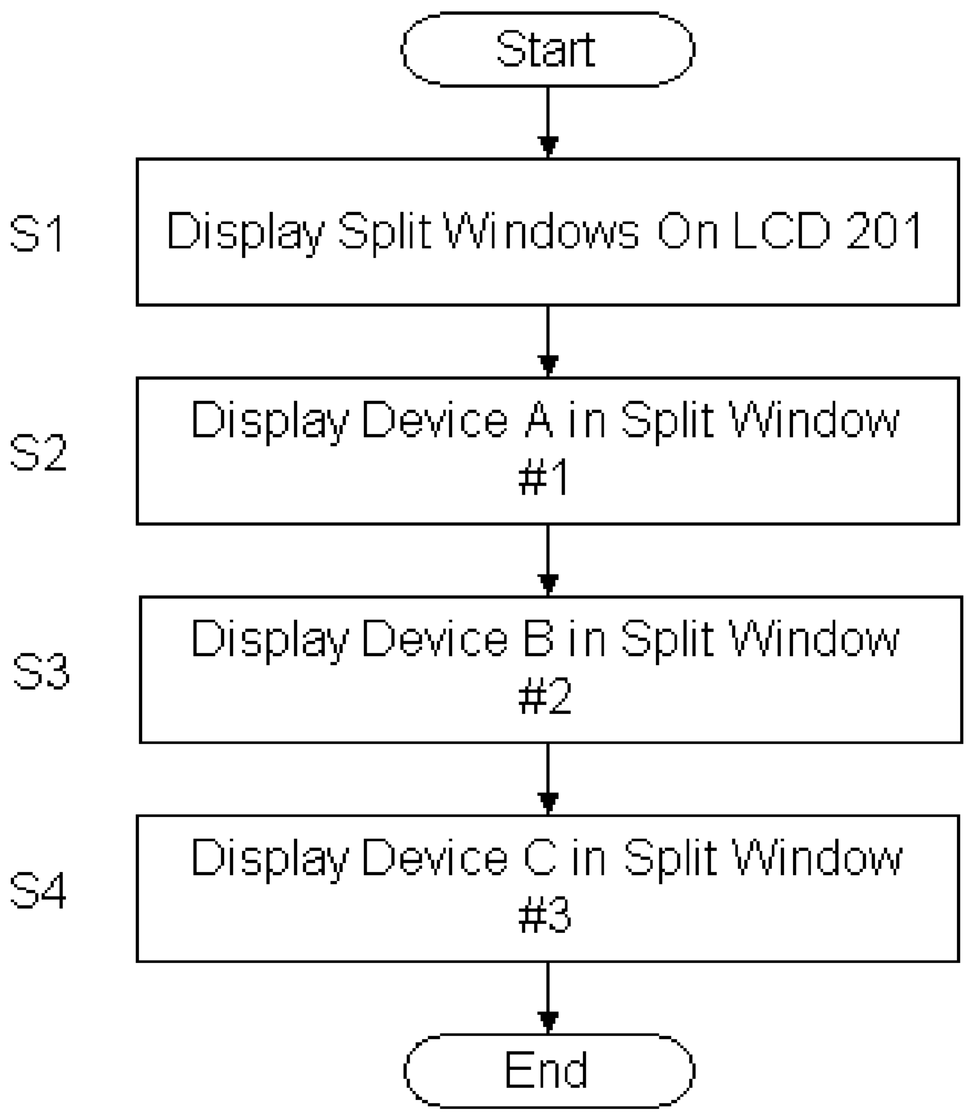

FIG. 950*c* is a flowchart illustrating an exemplary embodiment of the present invention.

Figure 950D:
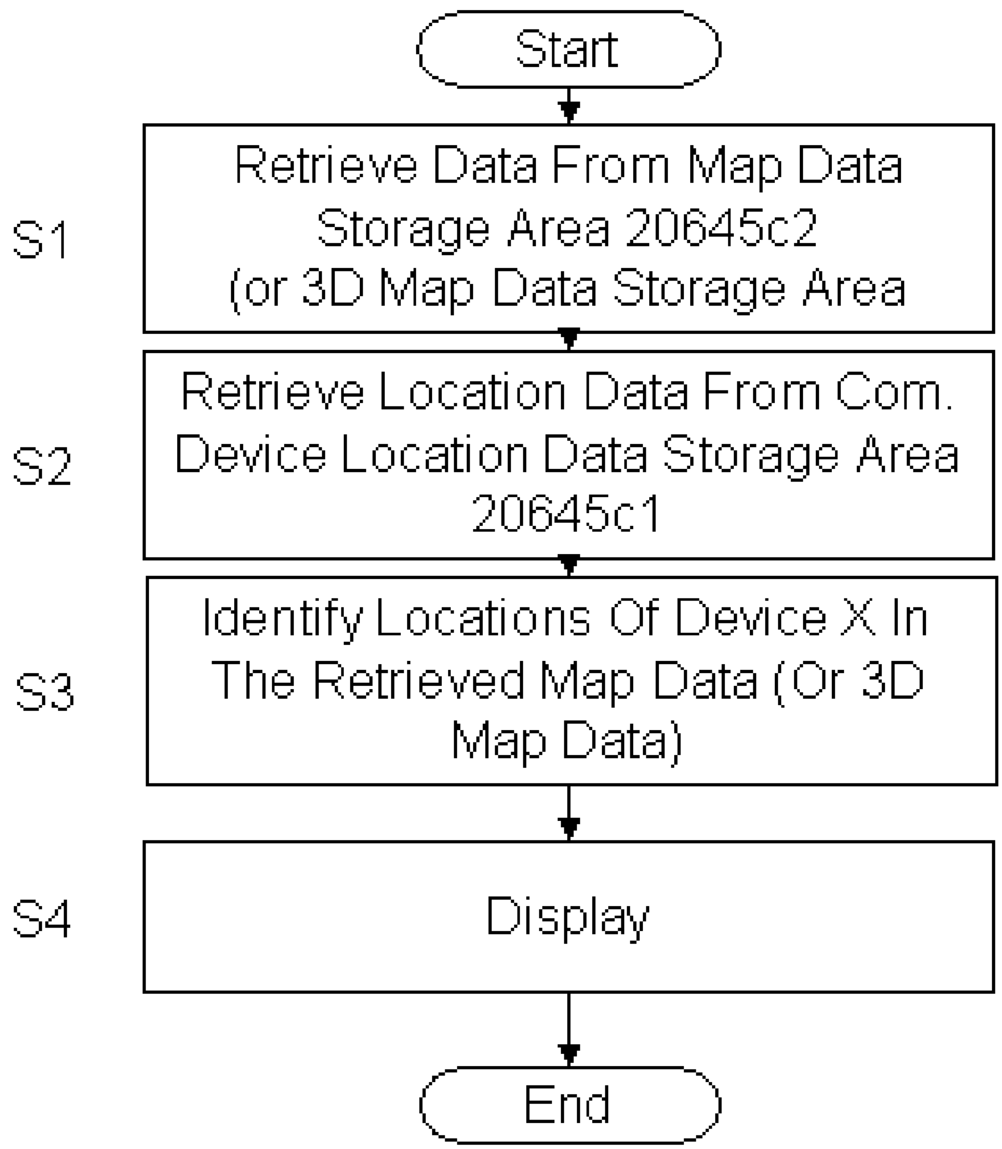

FIG. 950*d* is a flowchart illustrating an exemplary embodiment of the present invention.

Figure 950E:
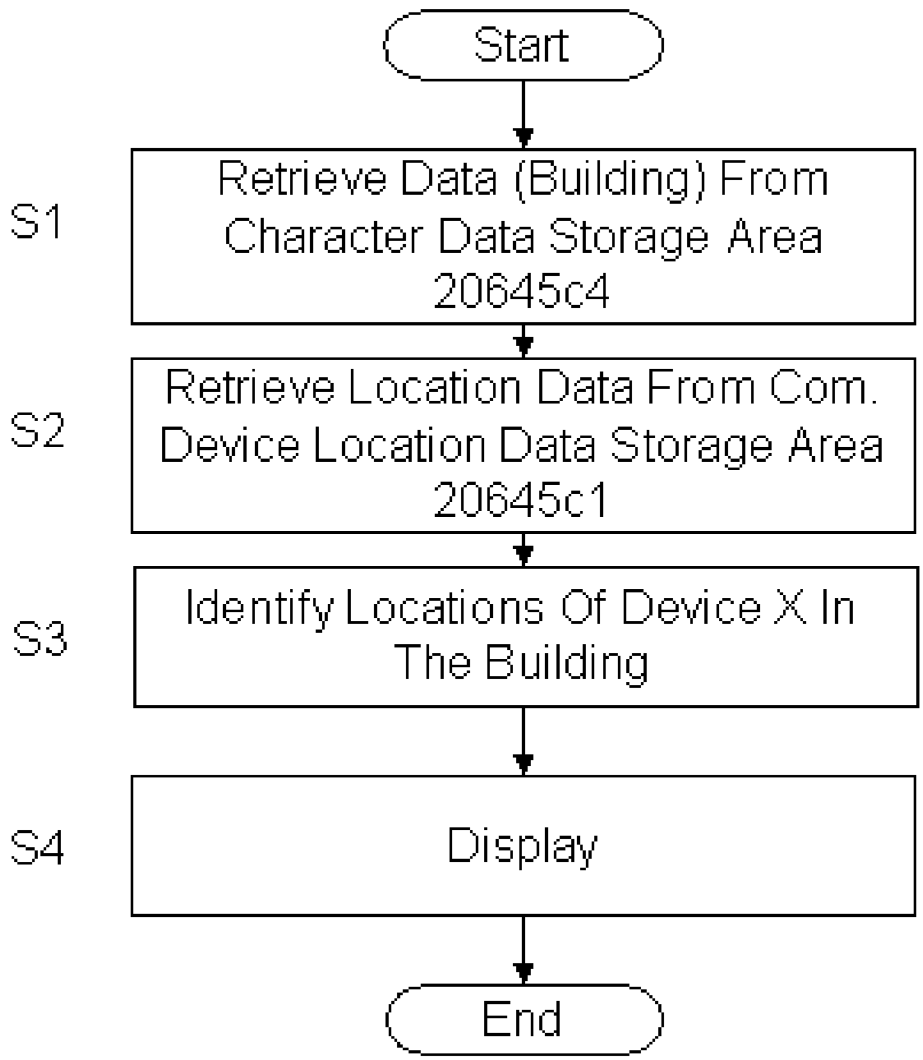

FIG. 950*e* is a flowchart illustrating an exemplary embodiment of the present invention.

Figure 950F:
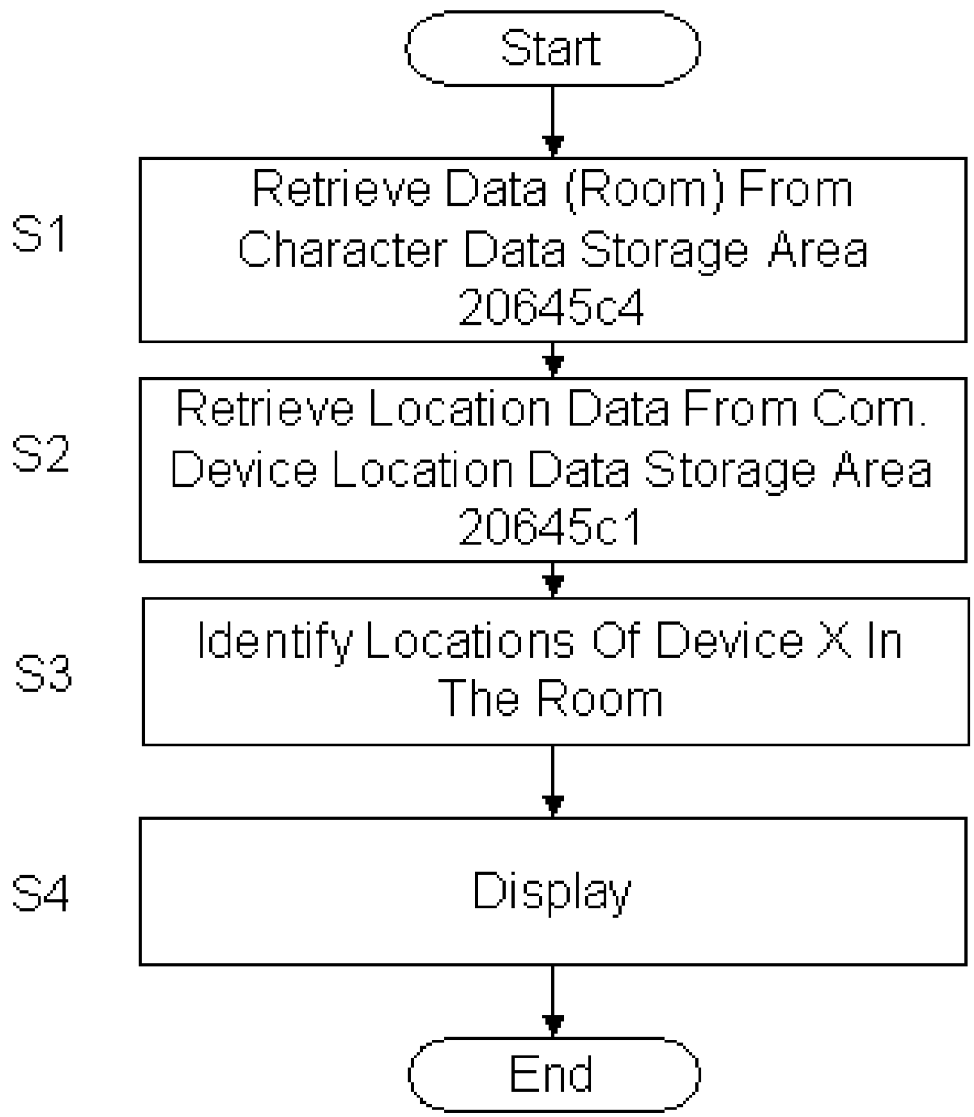

FIG. 950*f* is a flowchart illustrating an exemplary embodiment of the present invention.

Figure 951:
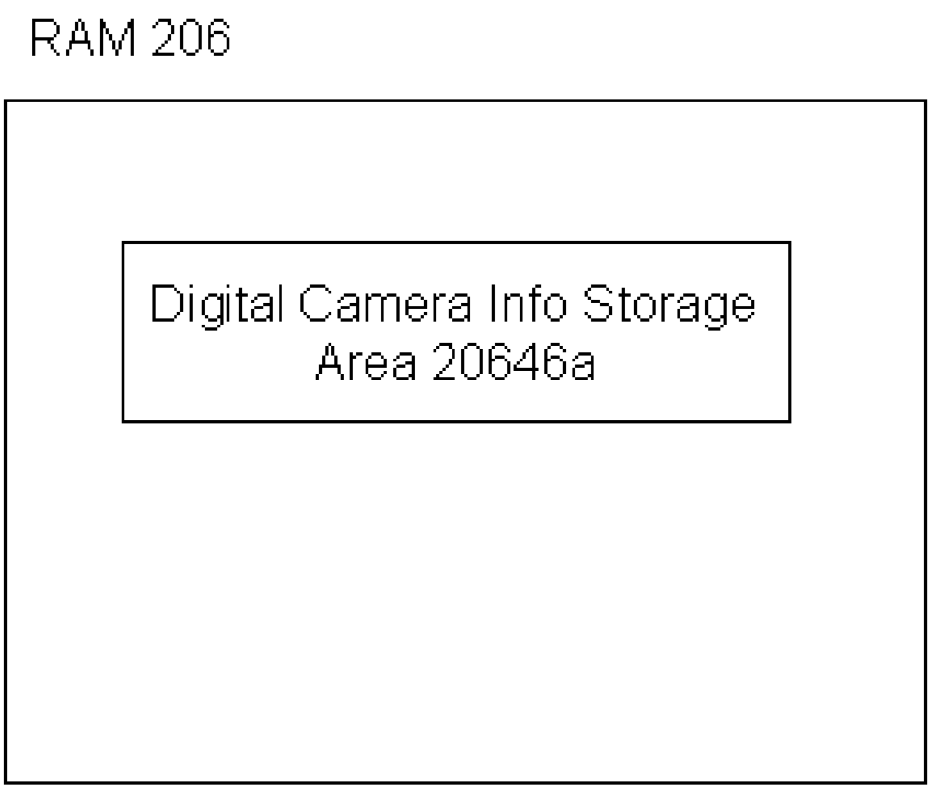

FIG. 951 is a block diagram illustrating an exemplary embodiment of the present invention.

Figure 951A:
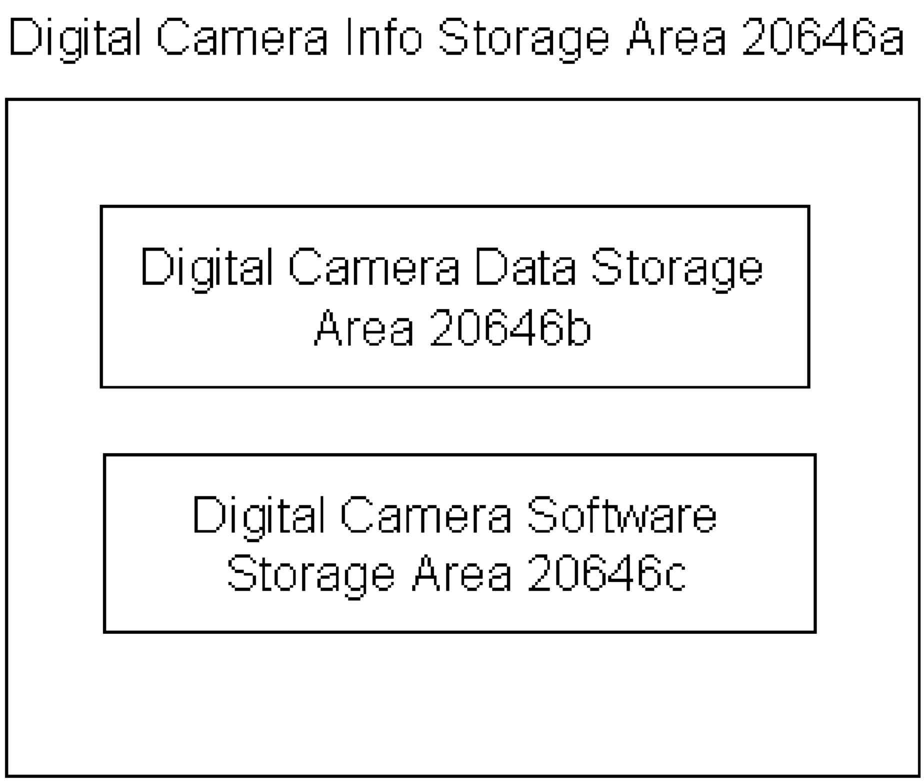

FIG. 951*a* is a block diagram illustrating an exemplary embodiment of the present invention.

Figure 952:
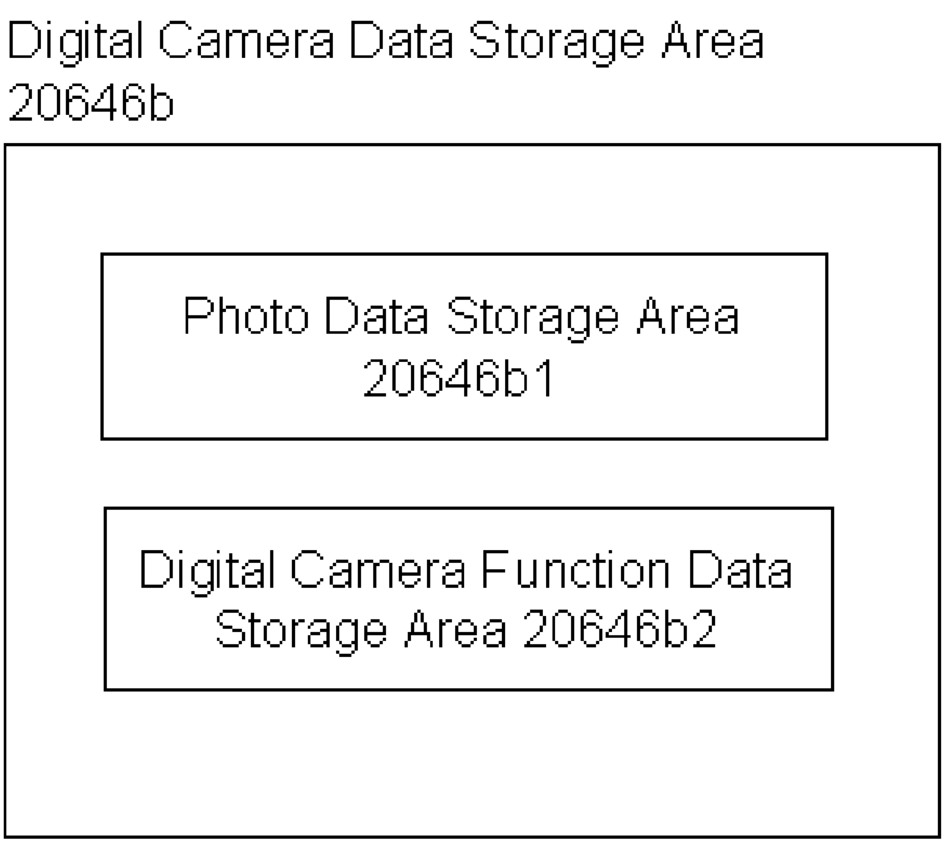

FIG. 952 is a block diagram illustrating an exemplary embodiment of the present invention.

FIG. 953 is a block diagram illustrating an exemplary embodiment of the present invention.

Figure 954:
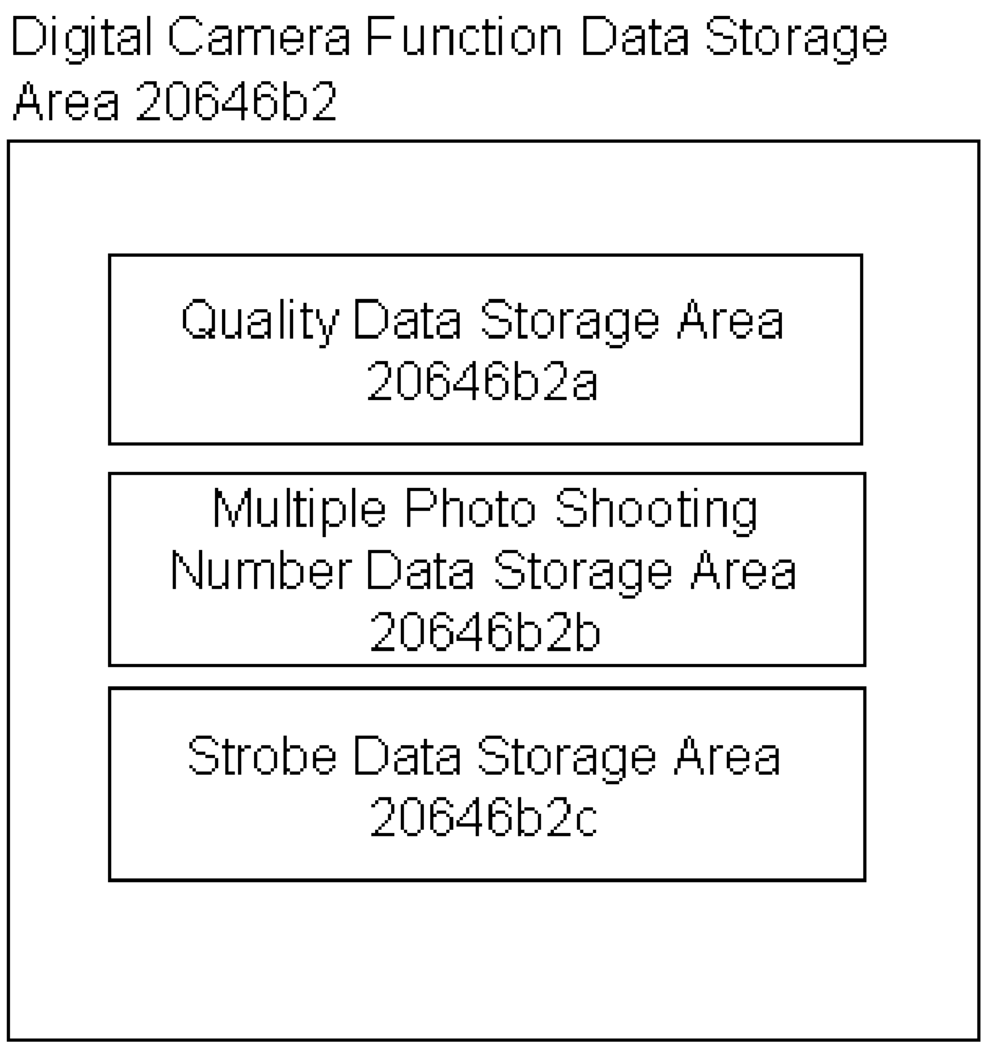

FIG. 954 is a block diagram illustrating an exemplary embodiment of the present invention.

Figure 955:
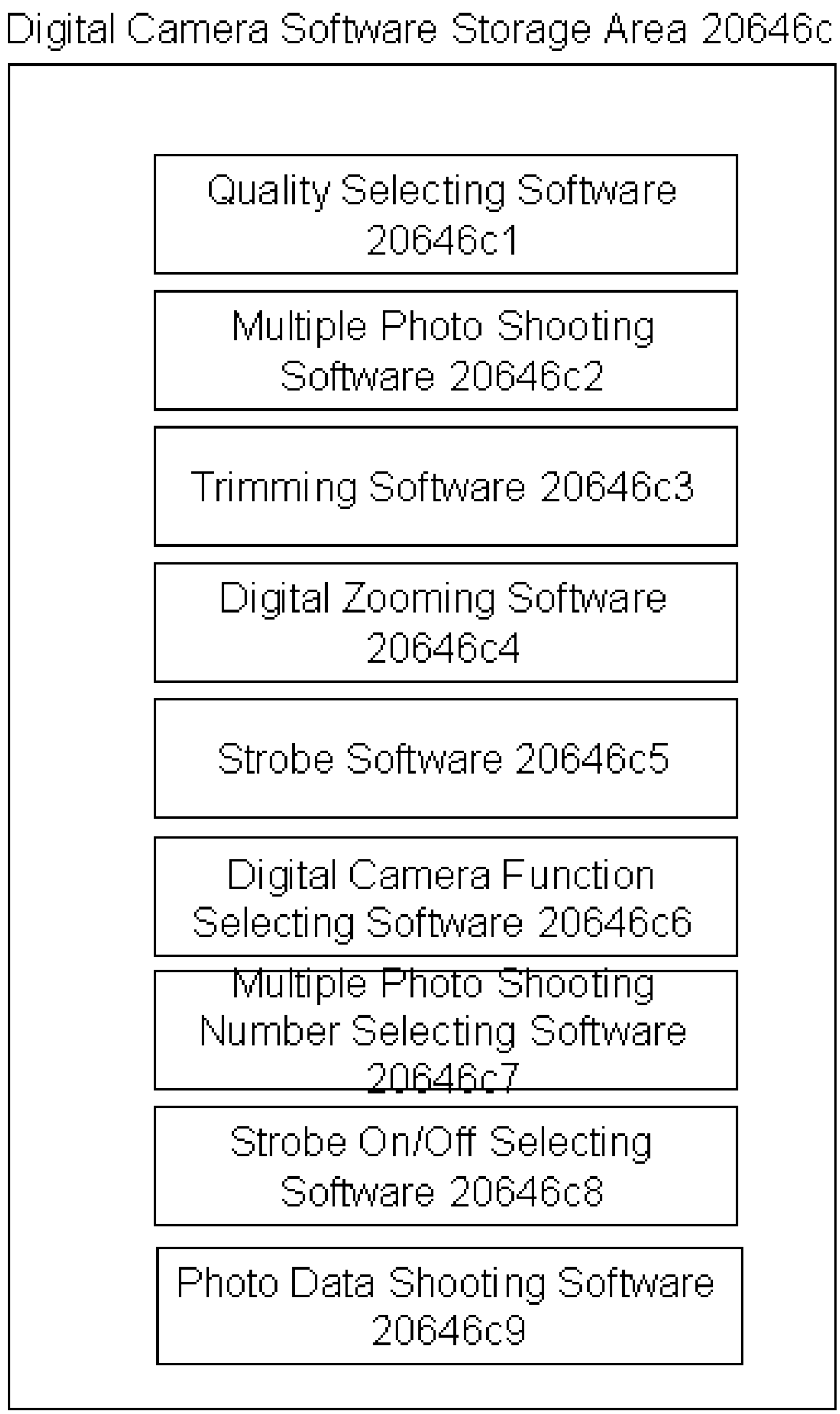

FIG. 955 is a block diagram illustrating an exemplary embodiment of the present invention.

Figure 956:
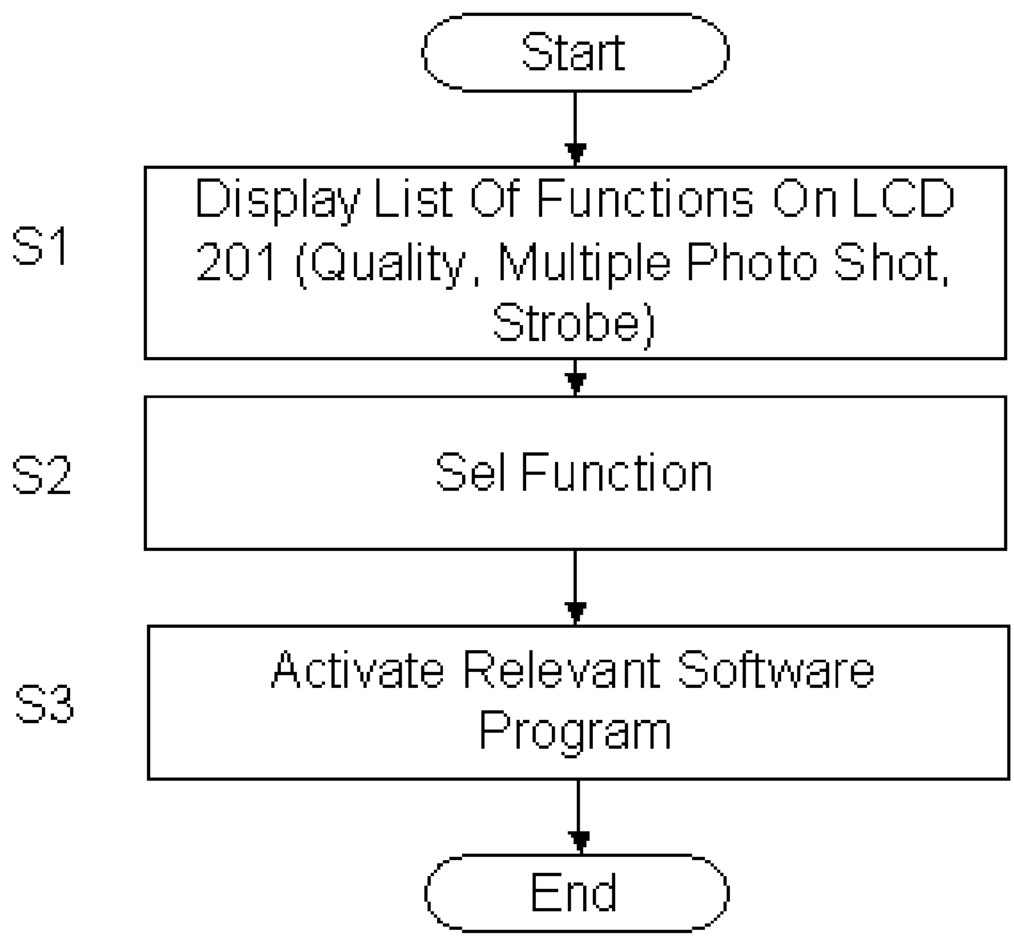

FIG. 956 is a flowchart illustrating an exemplary embodiment of the present invention.

Figure 957:
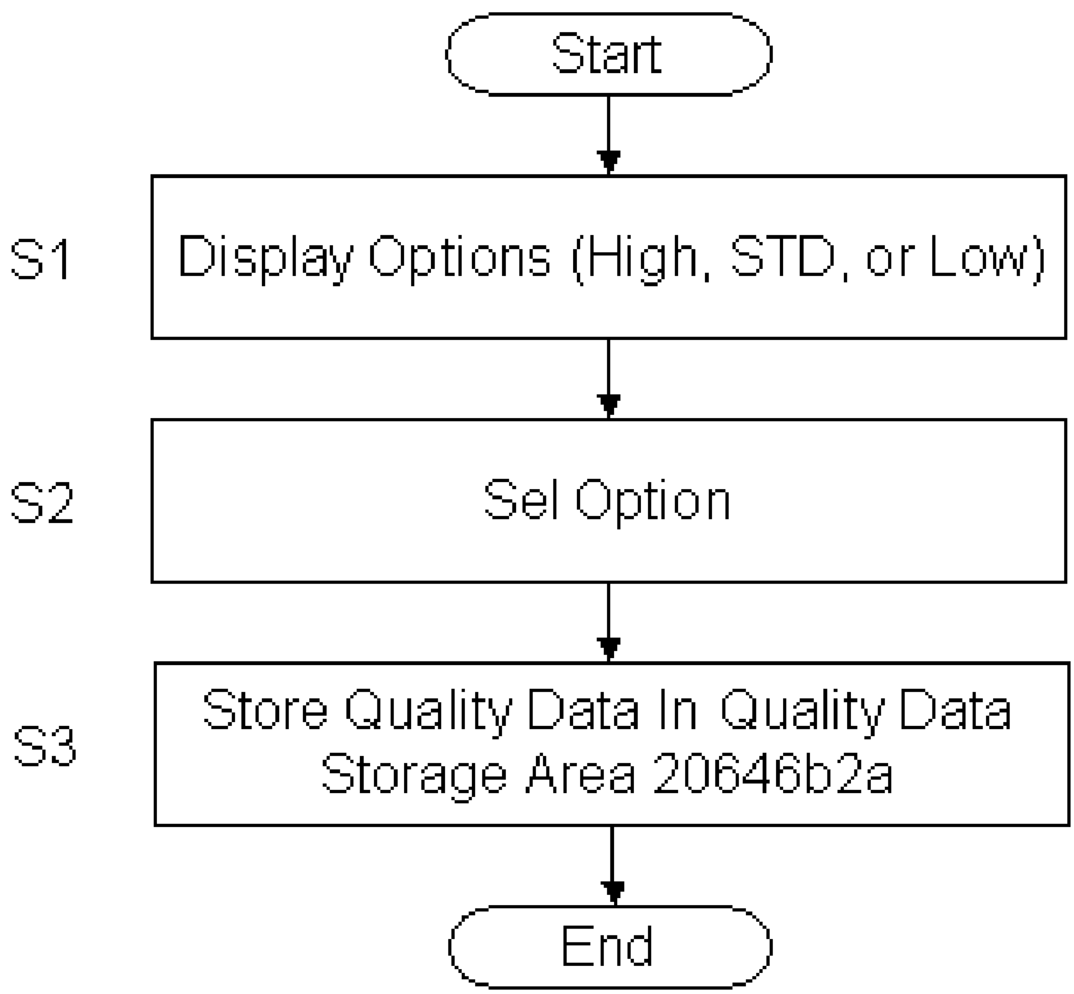

FIG. 957 is a flowchart illustrating an exemplary embodiment of the present invention.

Figure 958:
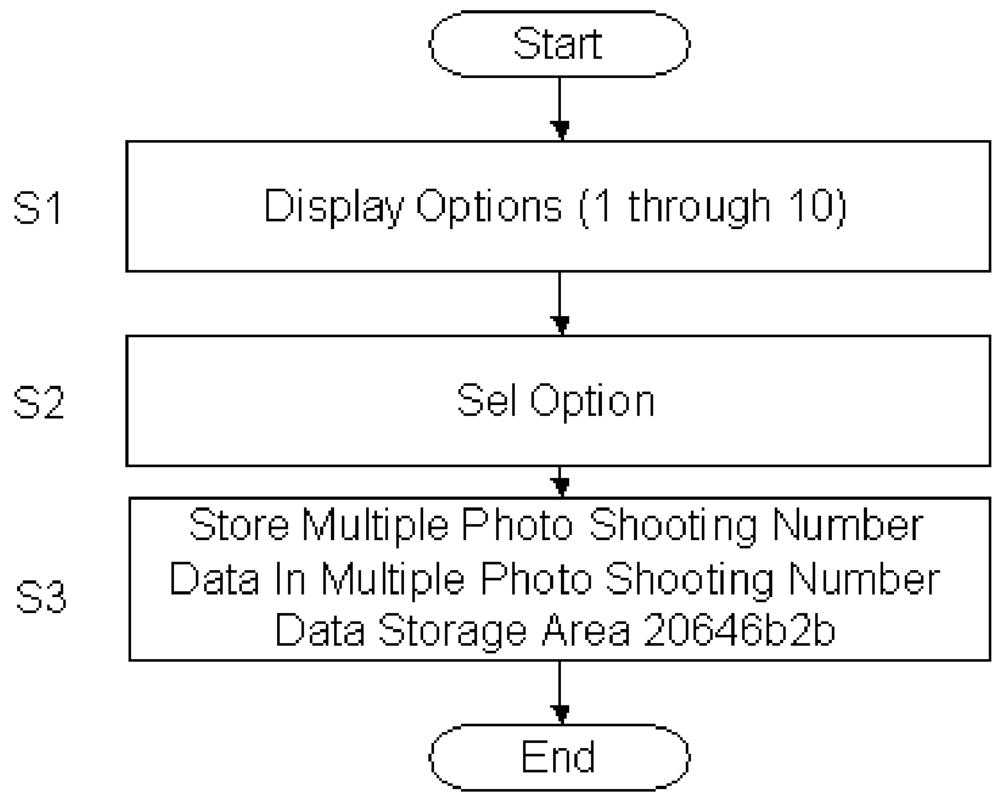

FIG. 958 is a flowchart illustrating an exemplary embodiment of the present invention.

Figure 959:
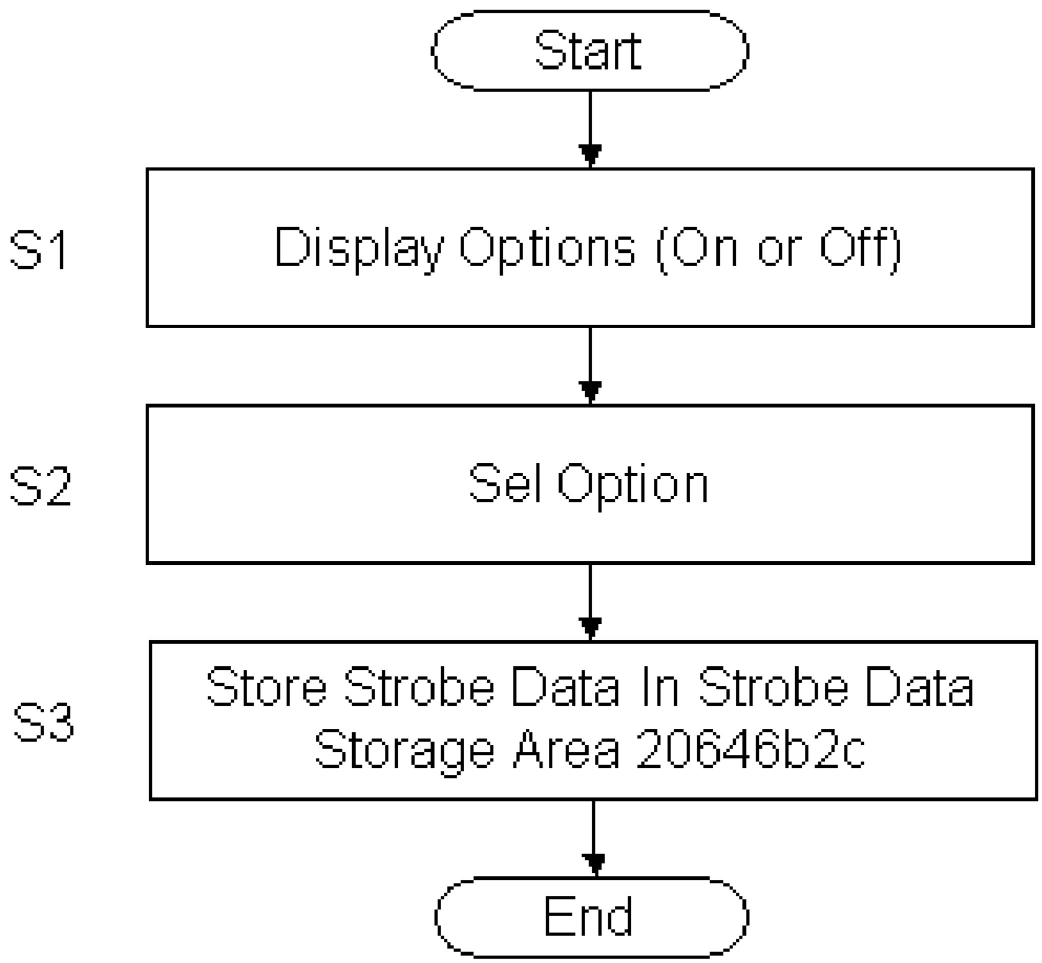

FIG. 959 is a flowchart illustrating an exemplary embodiment of the present invention.

Figure 960:
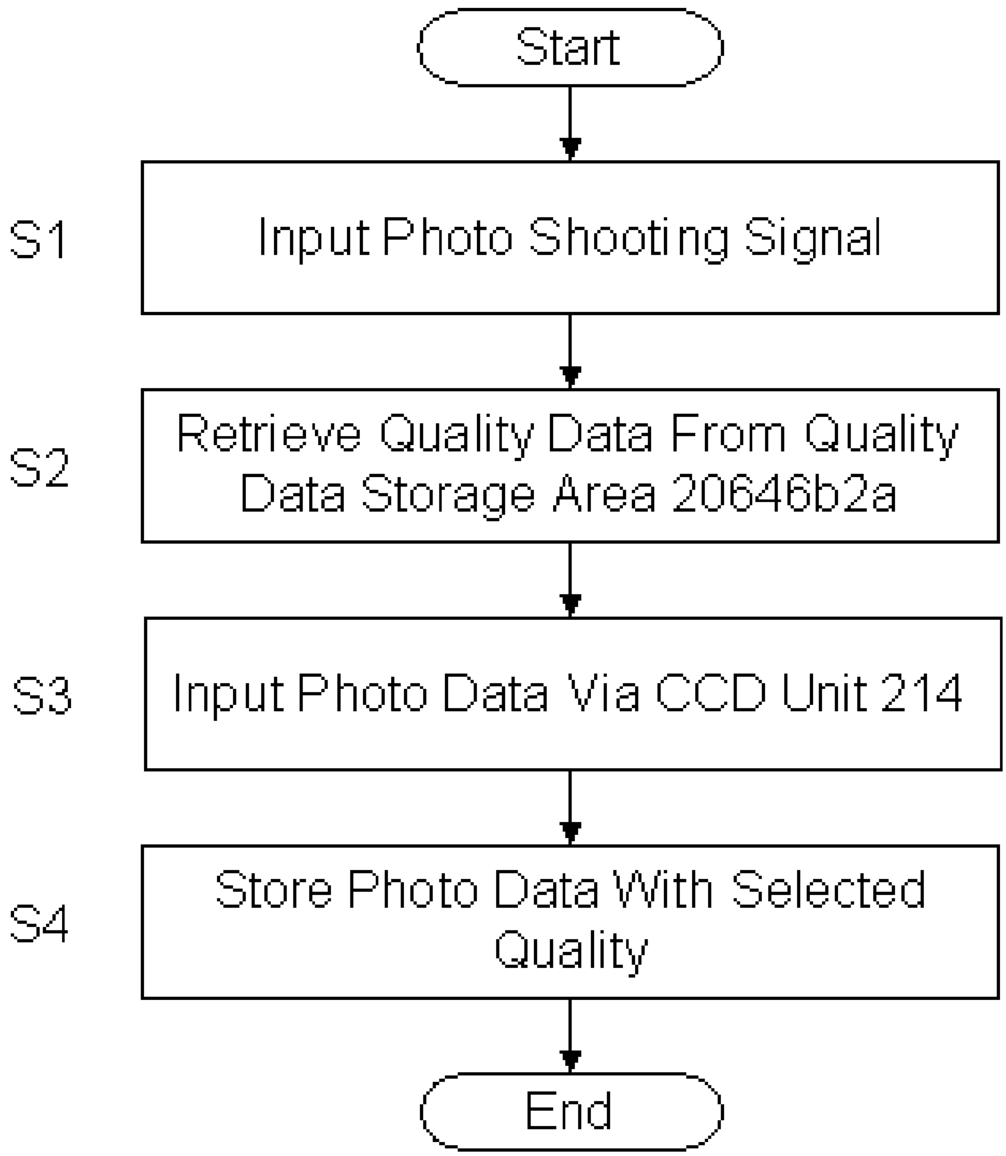

FIG. 960 is a flowchart illustrating an exemplary embodiment of the present invention.

Figure 961:
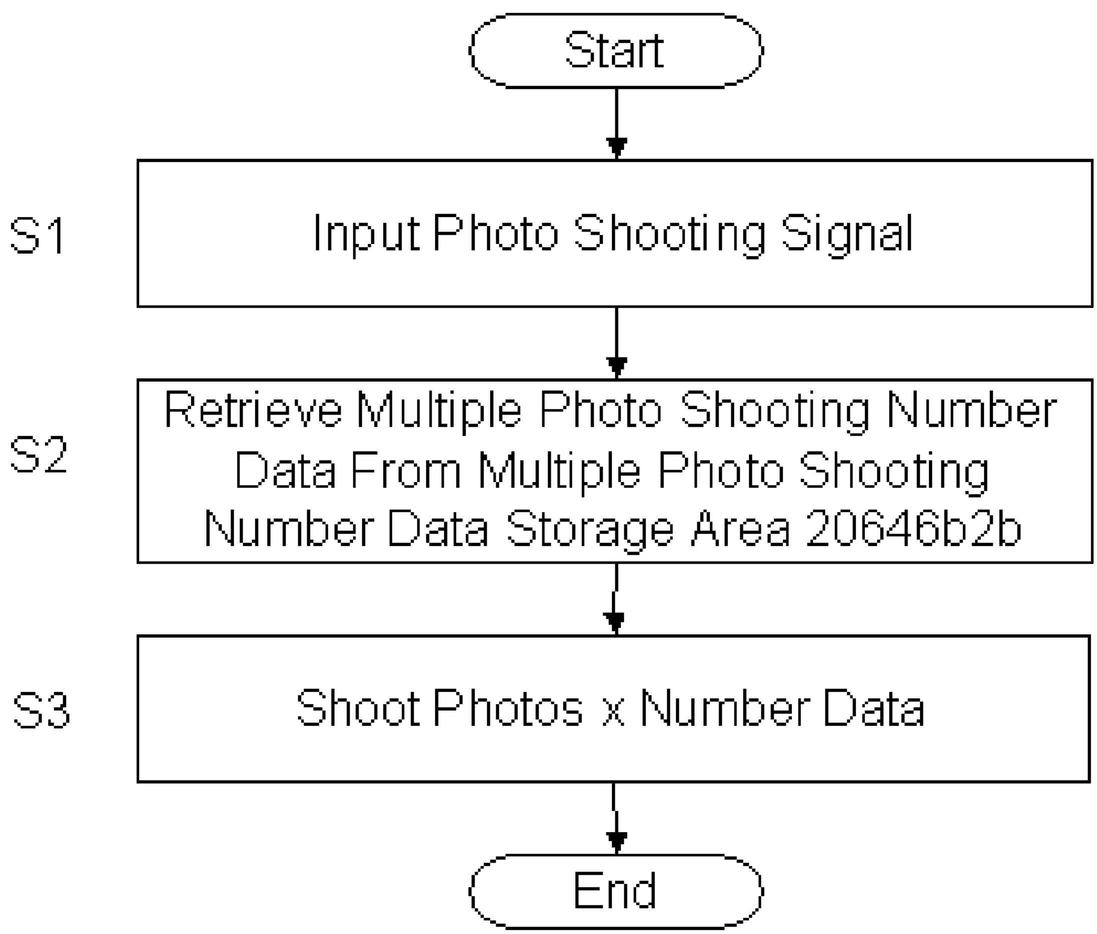

FIG. 961 is a flowchart illustrating an exemplary embodiment of the present invention.

Figure 962:
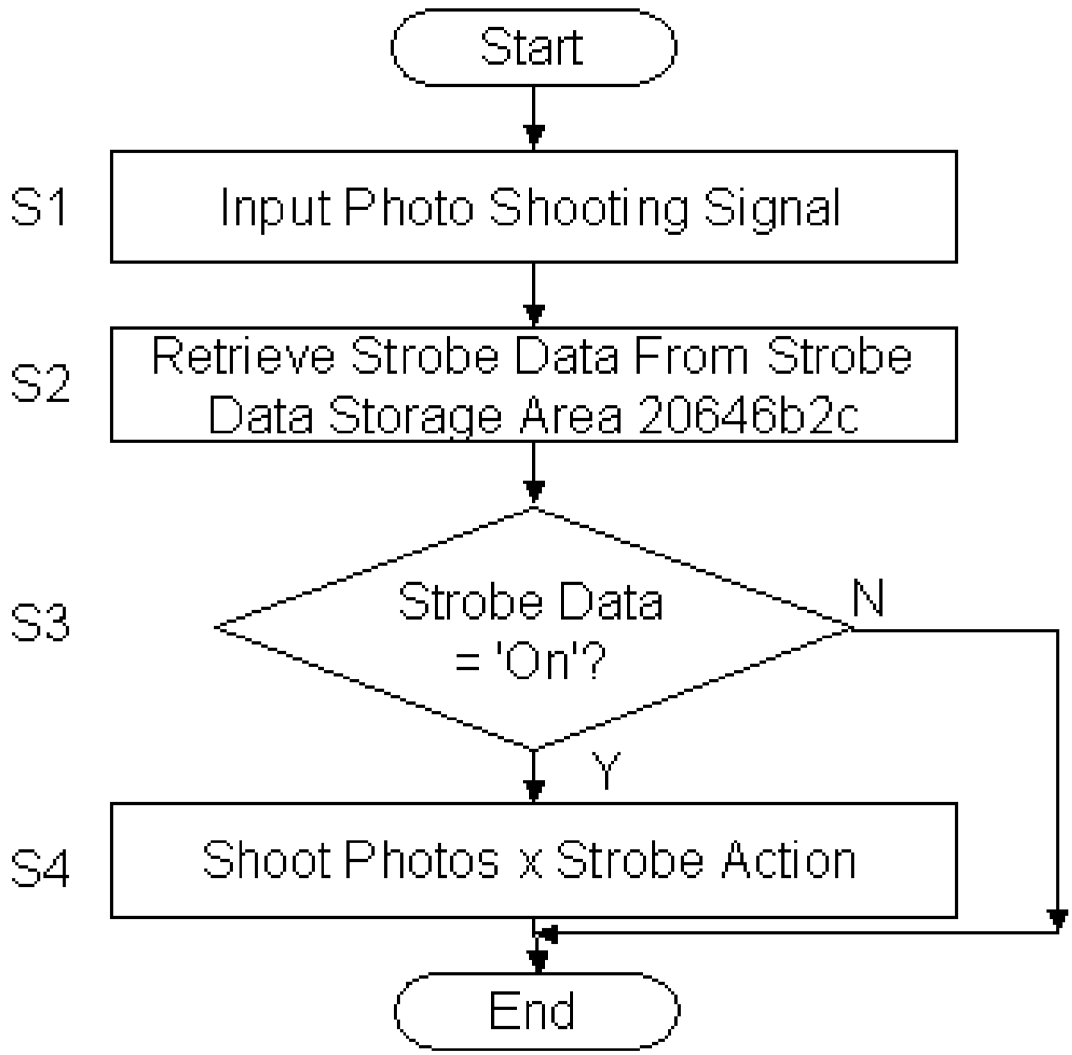

FIG. 962 is a flowchart illustrating an exemplary embodiment of the present invention.

Figure 963:
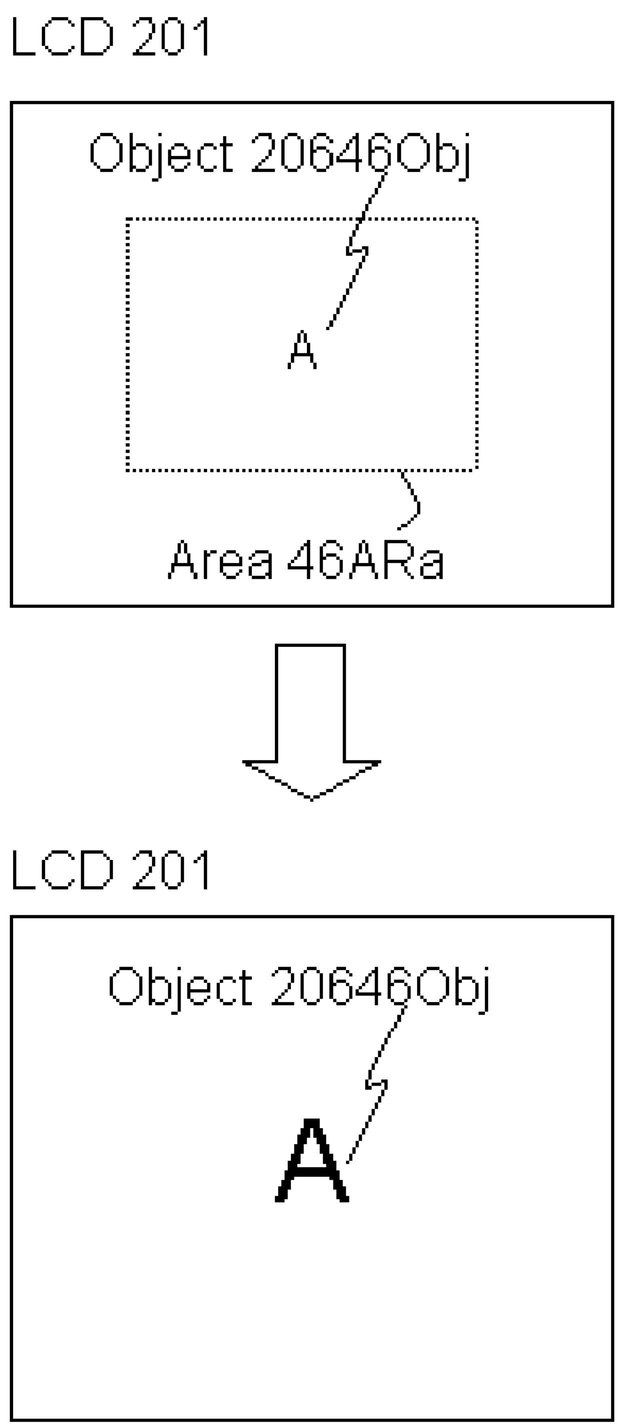

FIG. 963 is a simplified illustration illustrating an exemplary embodiment of the present invention.

Figure 964:
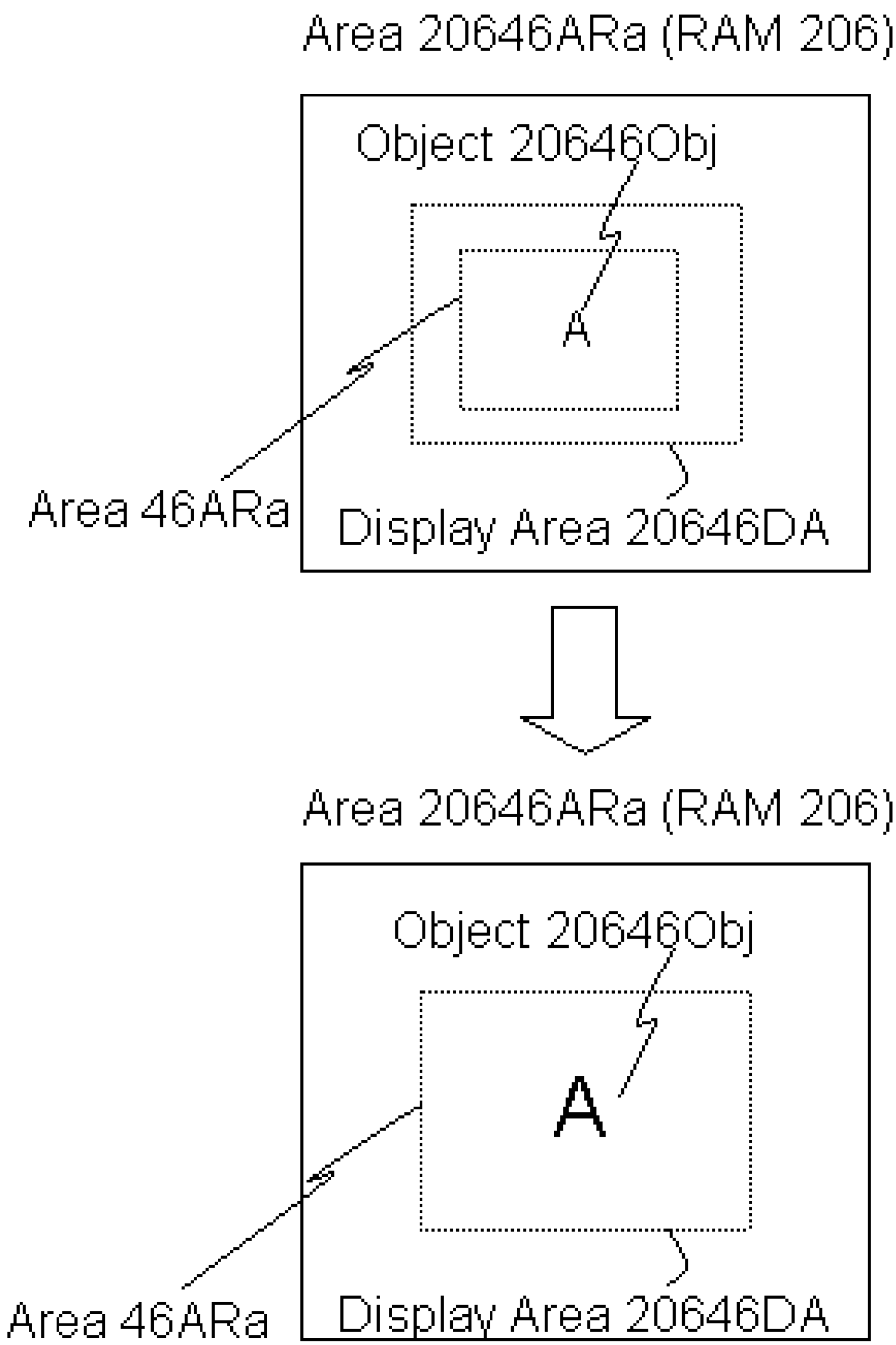

FIG. 964 is a simplified illustration illustrating an exemplary embodiment of the present invention.

Figure 965:
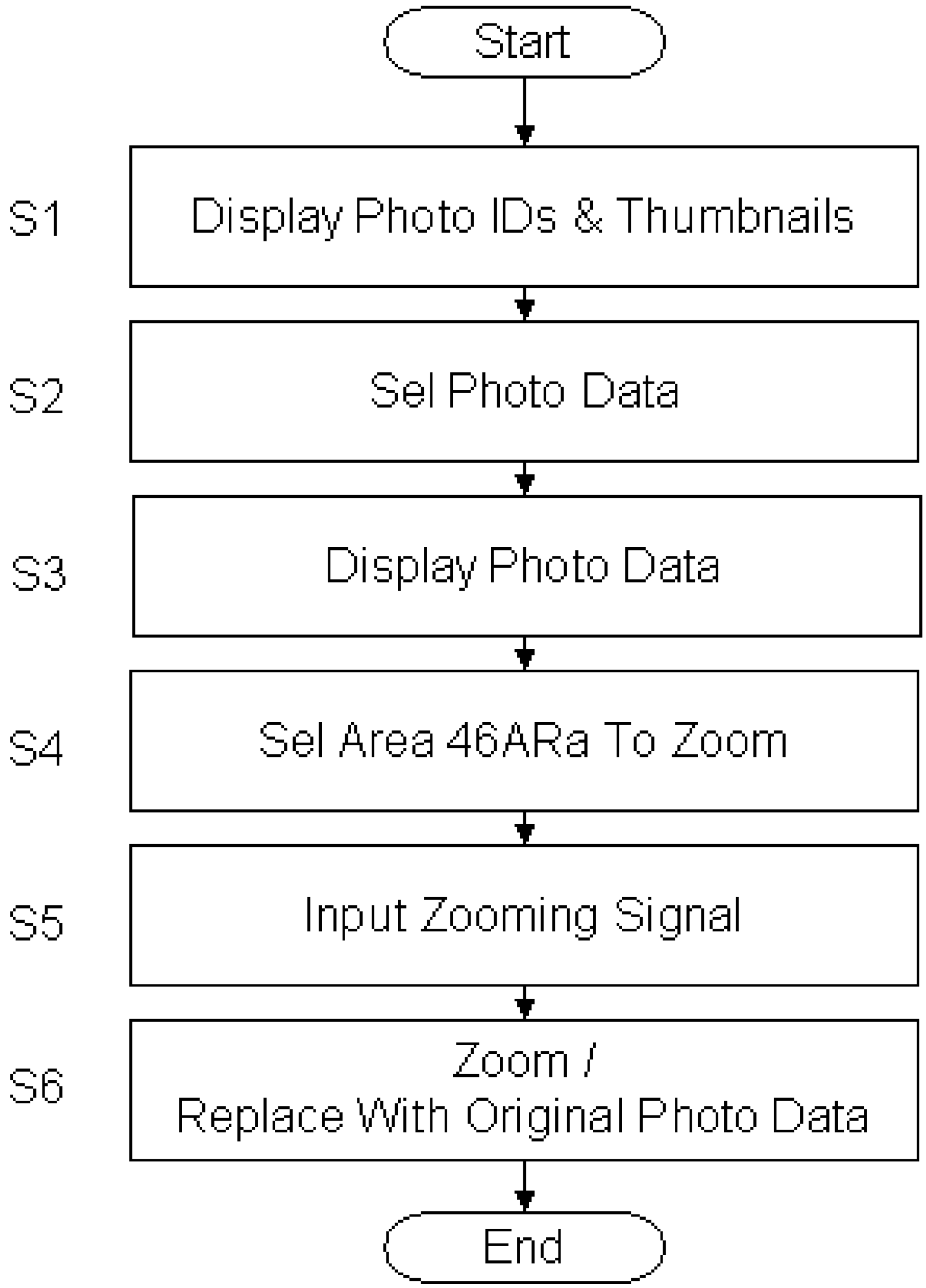

FIG. 965 is a flowchart illustrating an exemplary embodiment of the present invention.

Figure 966:
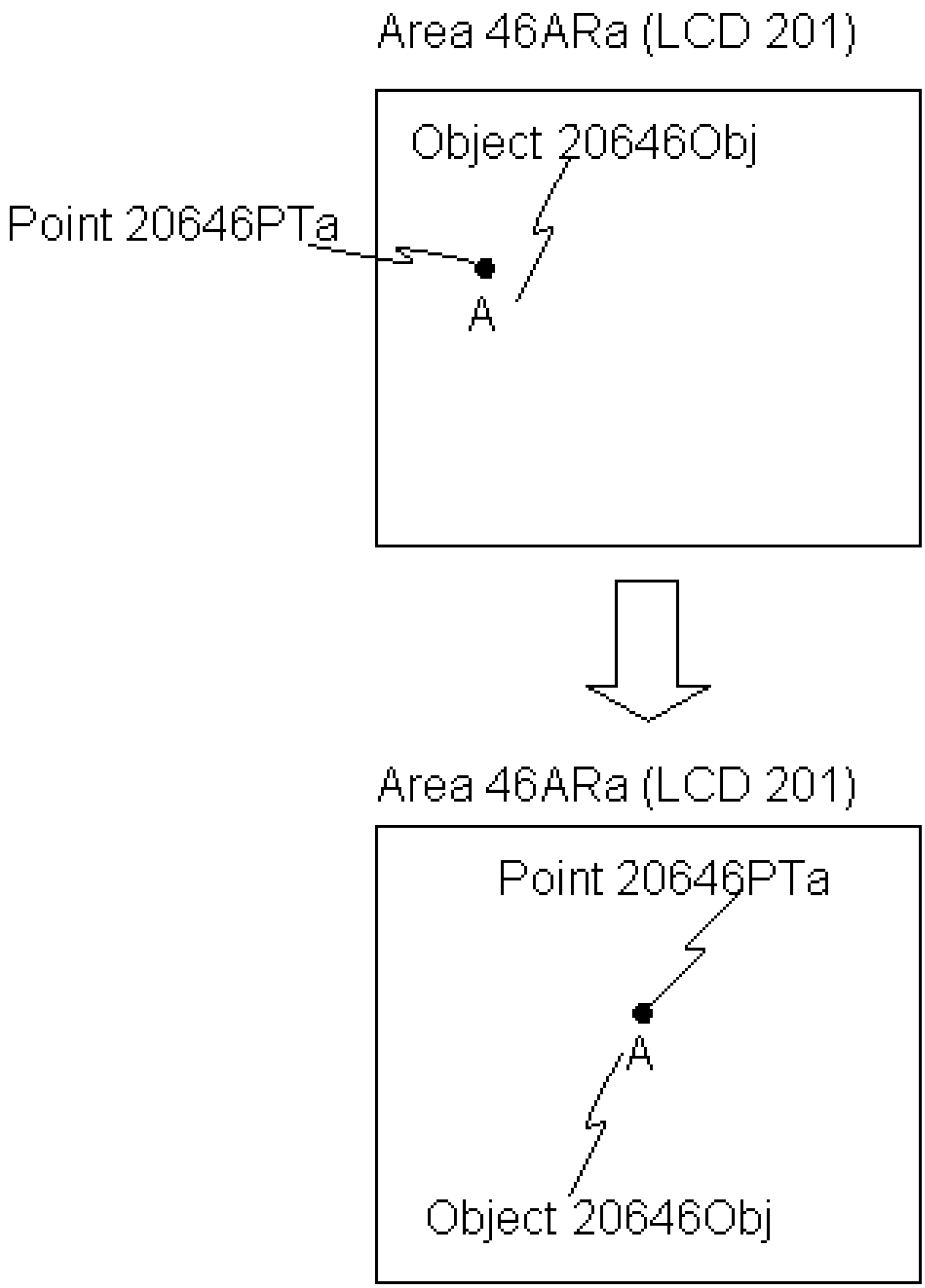

FIG. 966 is a simplified illustration illustrating an exemplary embodiment of the present invention.

Figure 967:
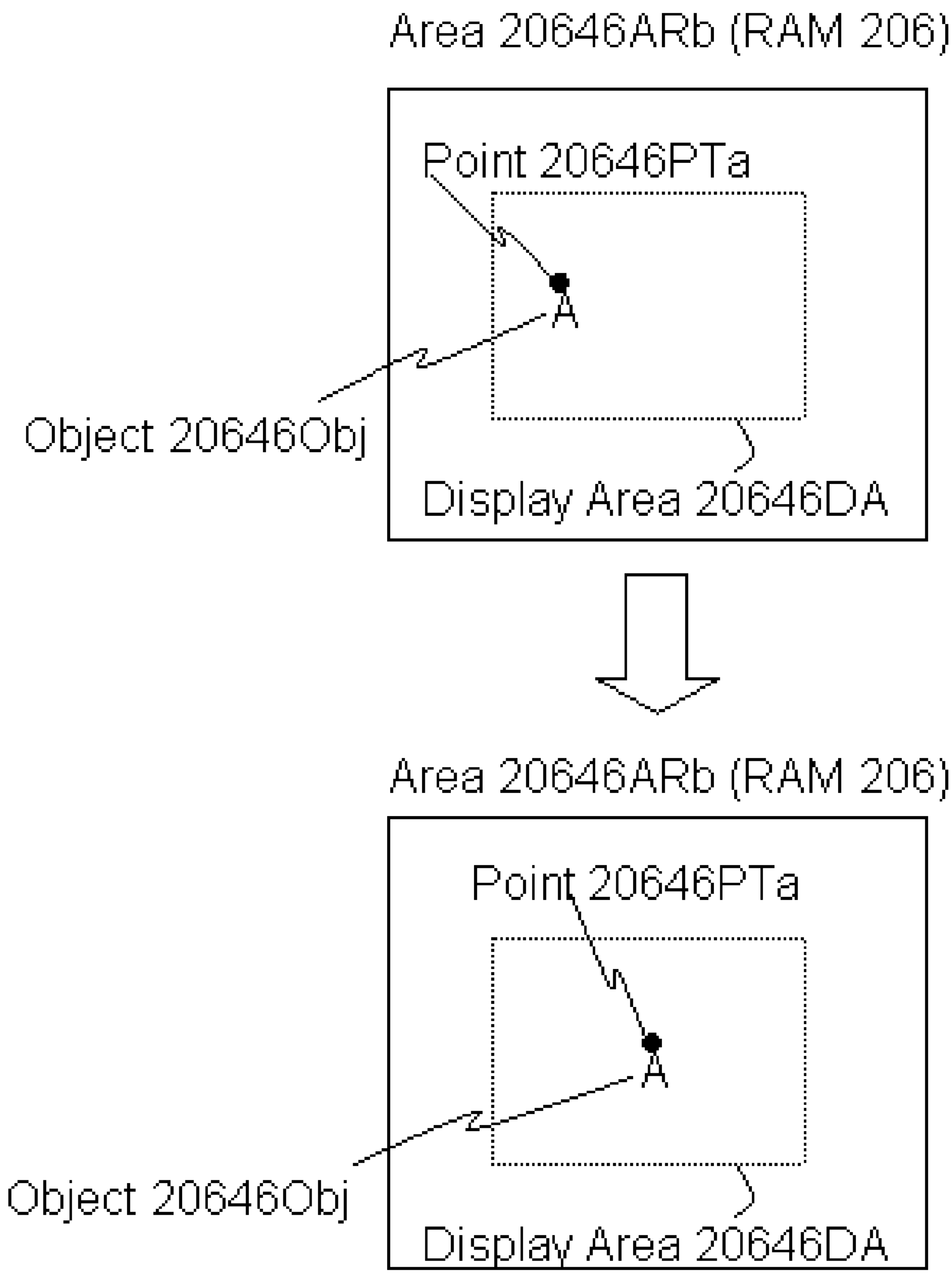

FIG. 967 is a simplified illustration illustrating an exemplary embodiment of the present invention.

Figure 968:
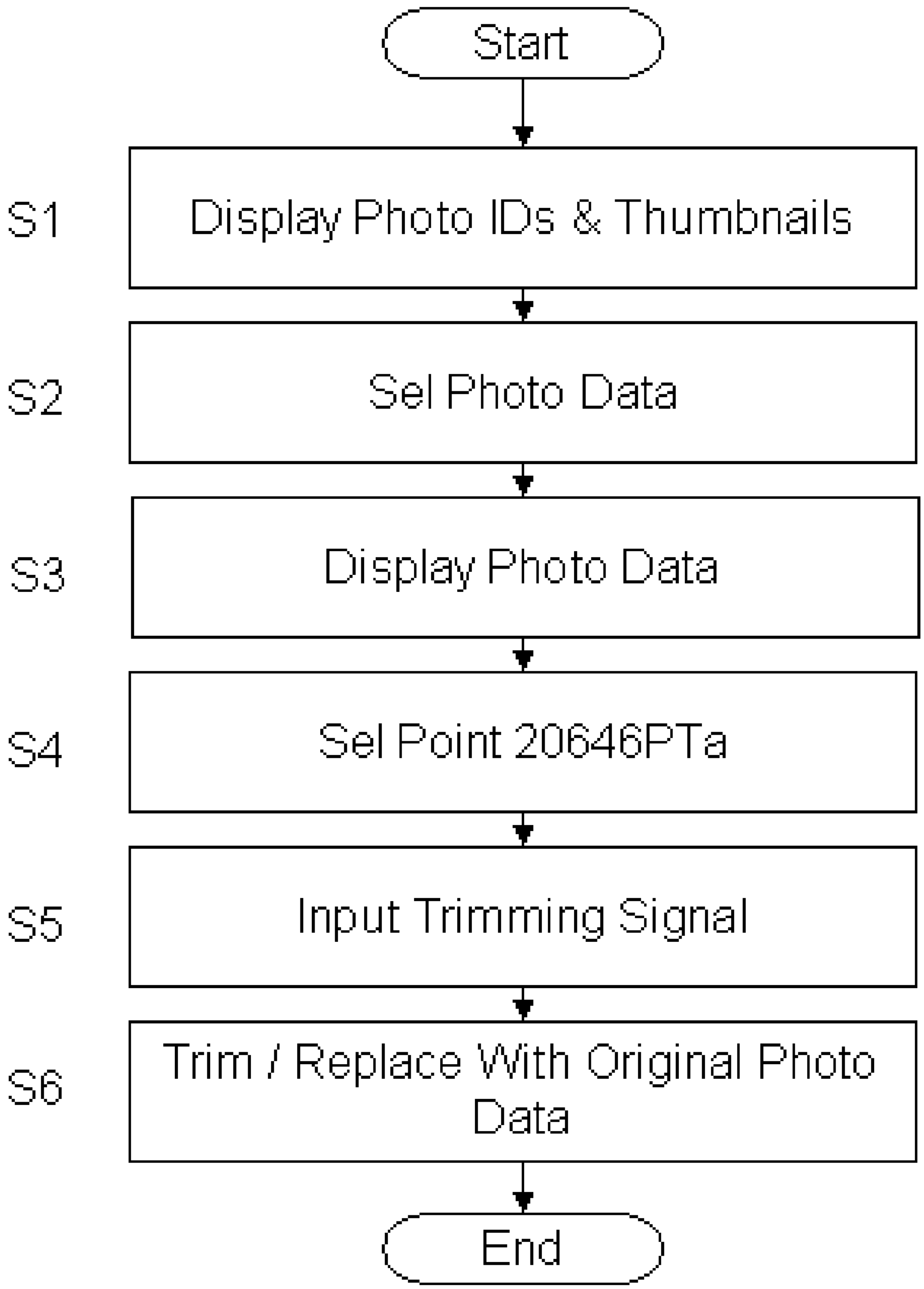

FIG. 968 is a flowchart illustrating an exemplary embodiment of the present invention.

Figure 968A:
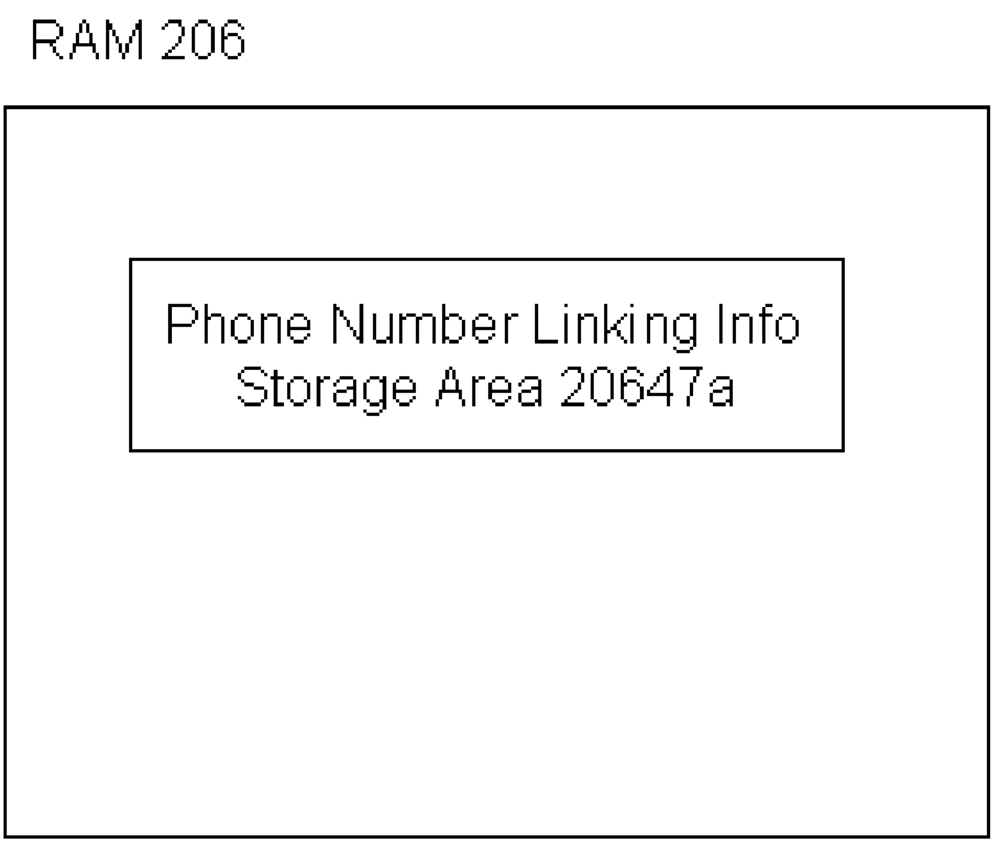

FIG. 968*a* is a block diagram illustrating an exemplary embodiment of the present invention.

Figure 969:
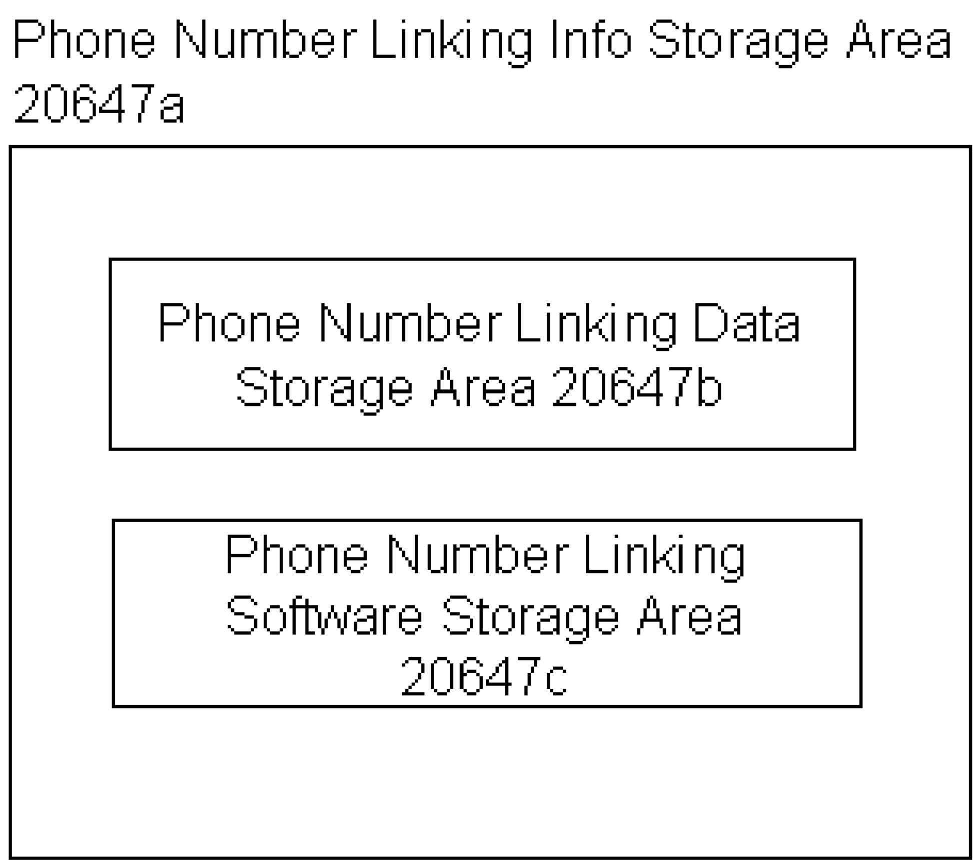

FIG. 969 is a block diagram illustrating an exemplary embodiment of the present invention.

Figure 970:
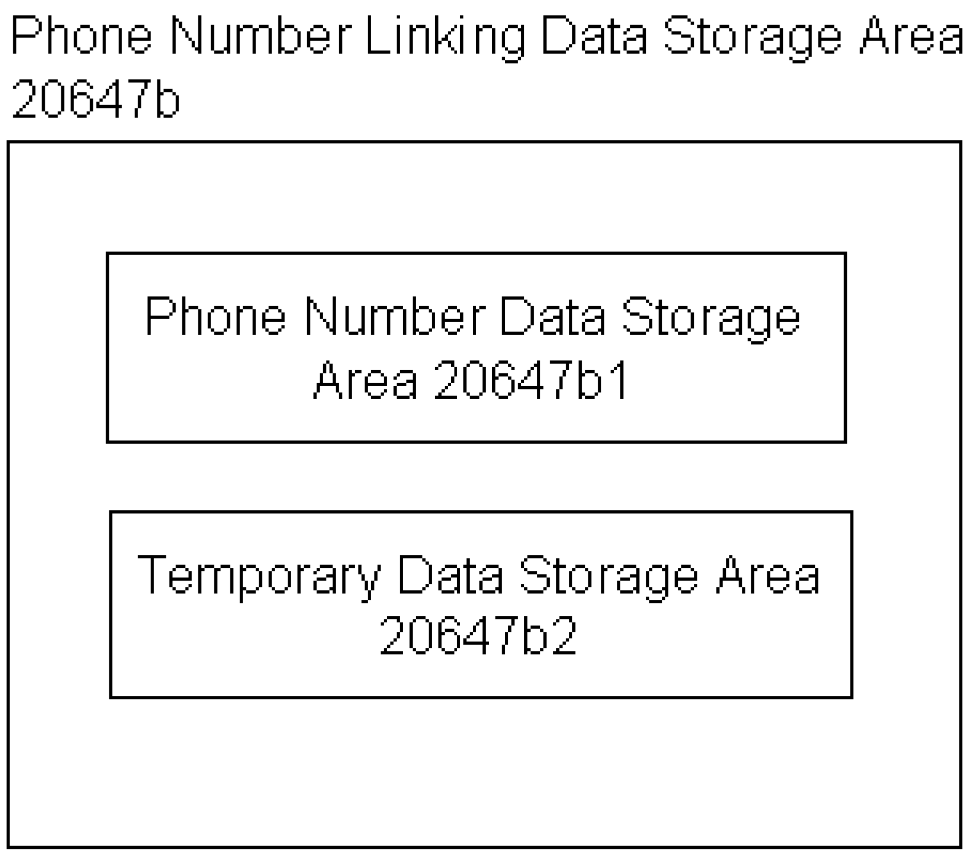

FIG. 970 is a block diagram illustrating an exemplary embodiment of the present invention.

FIG. 971 is a block diagram illustrating an exemplary embodiment of the present invention.

Figure 972:
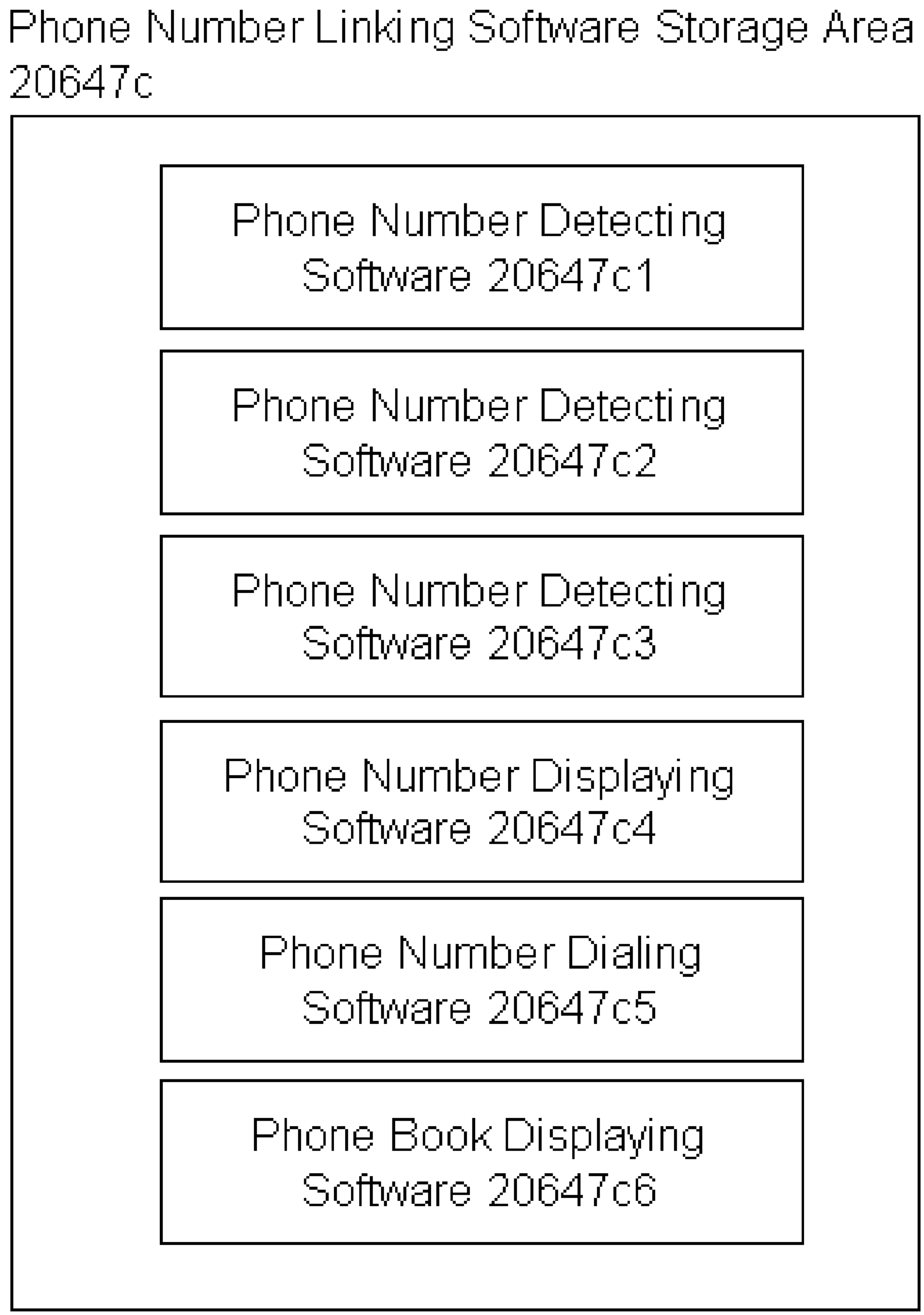

FIG. 972 is a block diagram illustrating an exemplary embodiment of the present invention.

Figure 973:
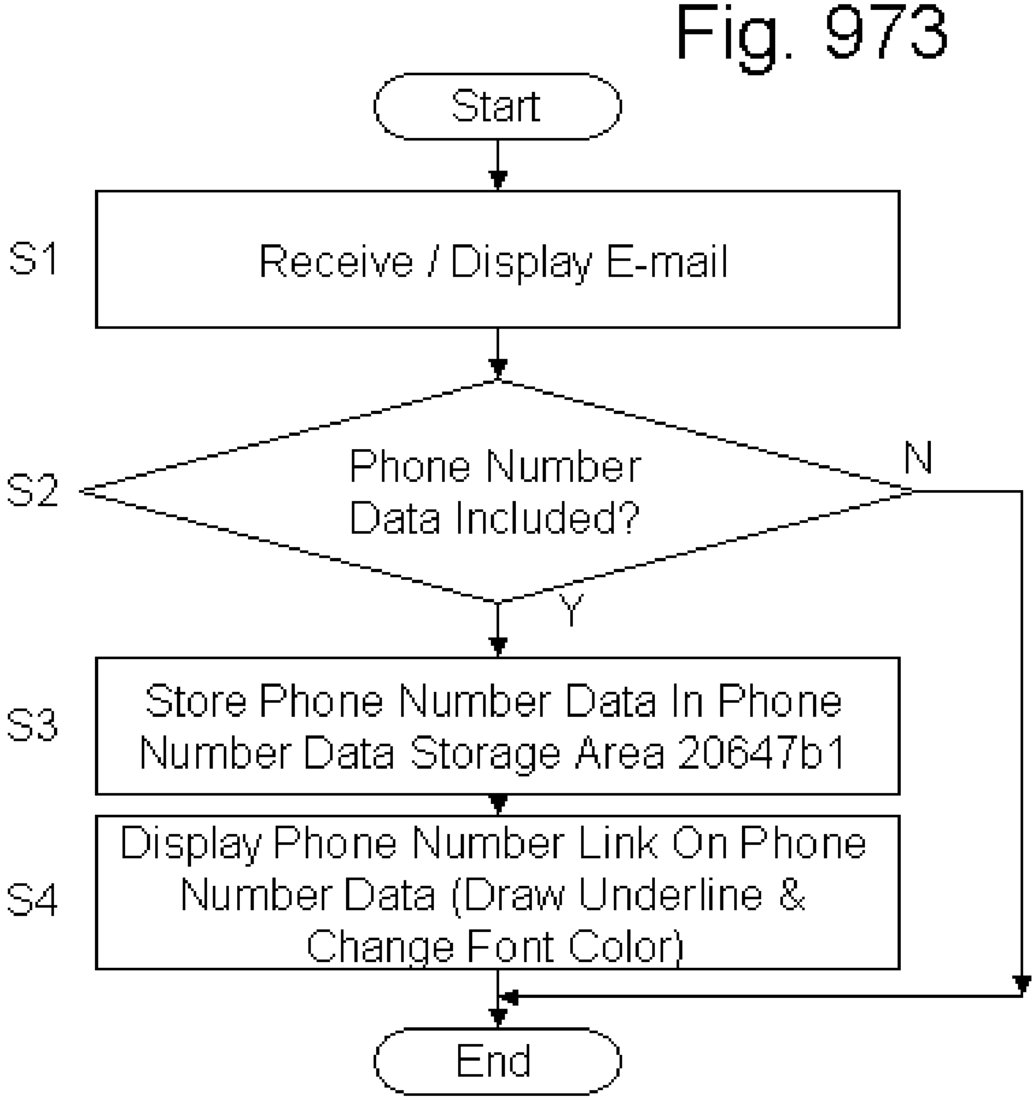

FIG. 973 is a flowchart illustrating an exemplary embodiment of the present invention.

Figure 974:
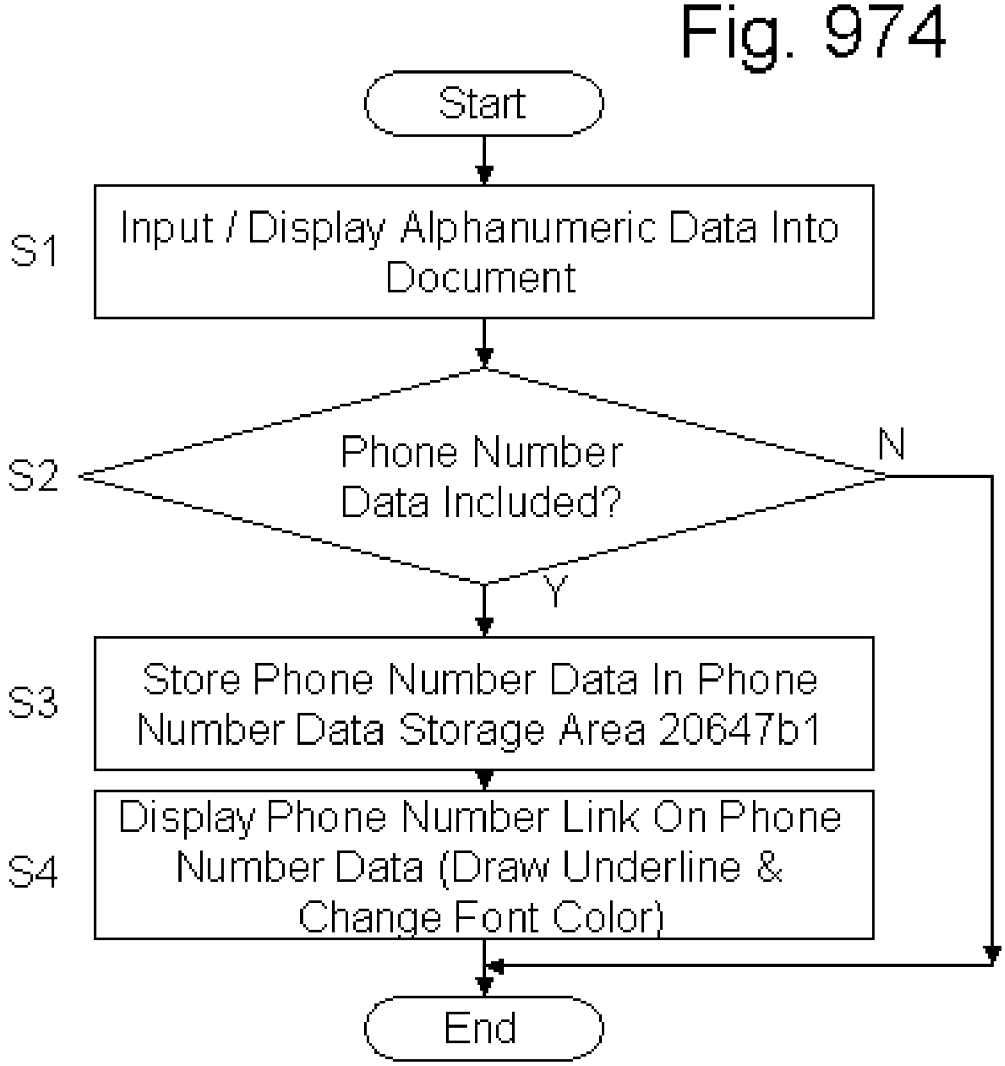

FIG. 974 is a flowchart illustrating an exemplary embodiment of the present invention.

Figure 975:
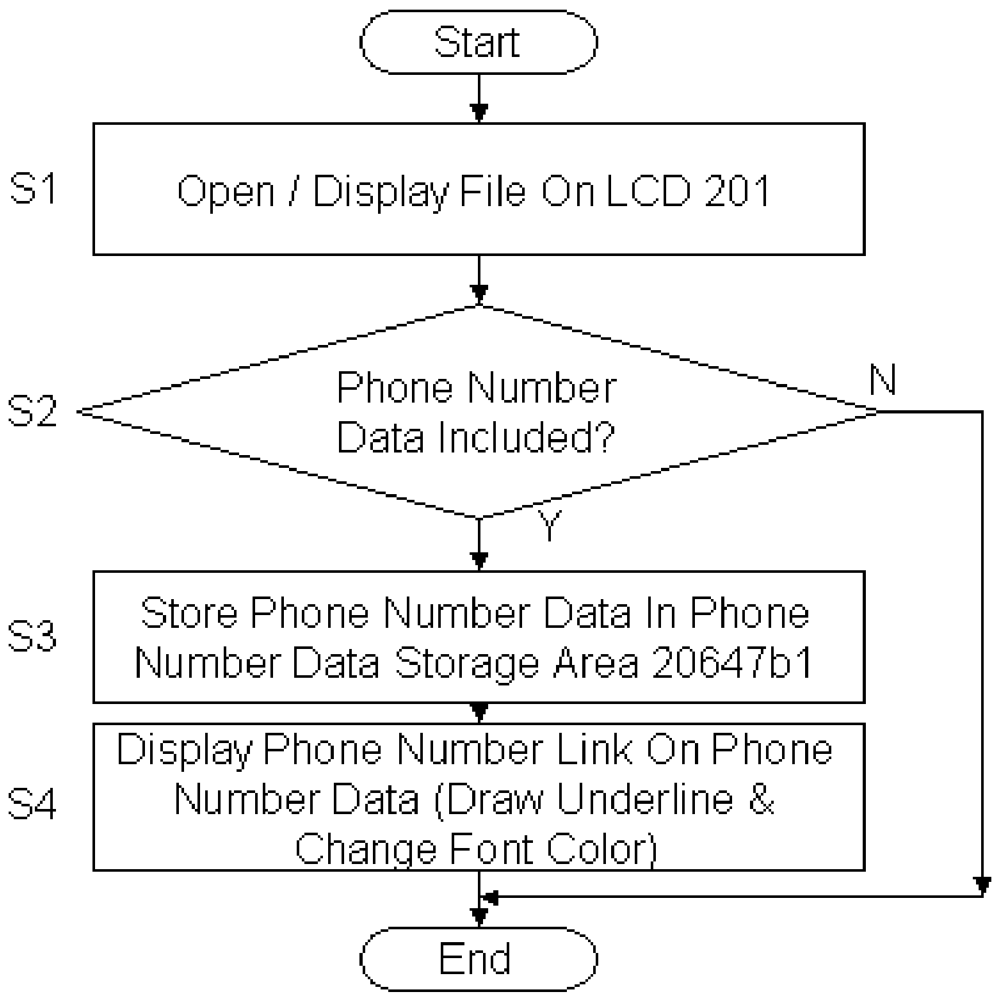

FIG. 975 is a flowchart illustrating an exemplary embodiment of the present invention.

Figure 976:
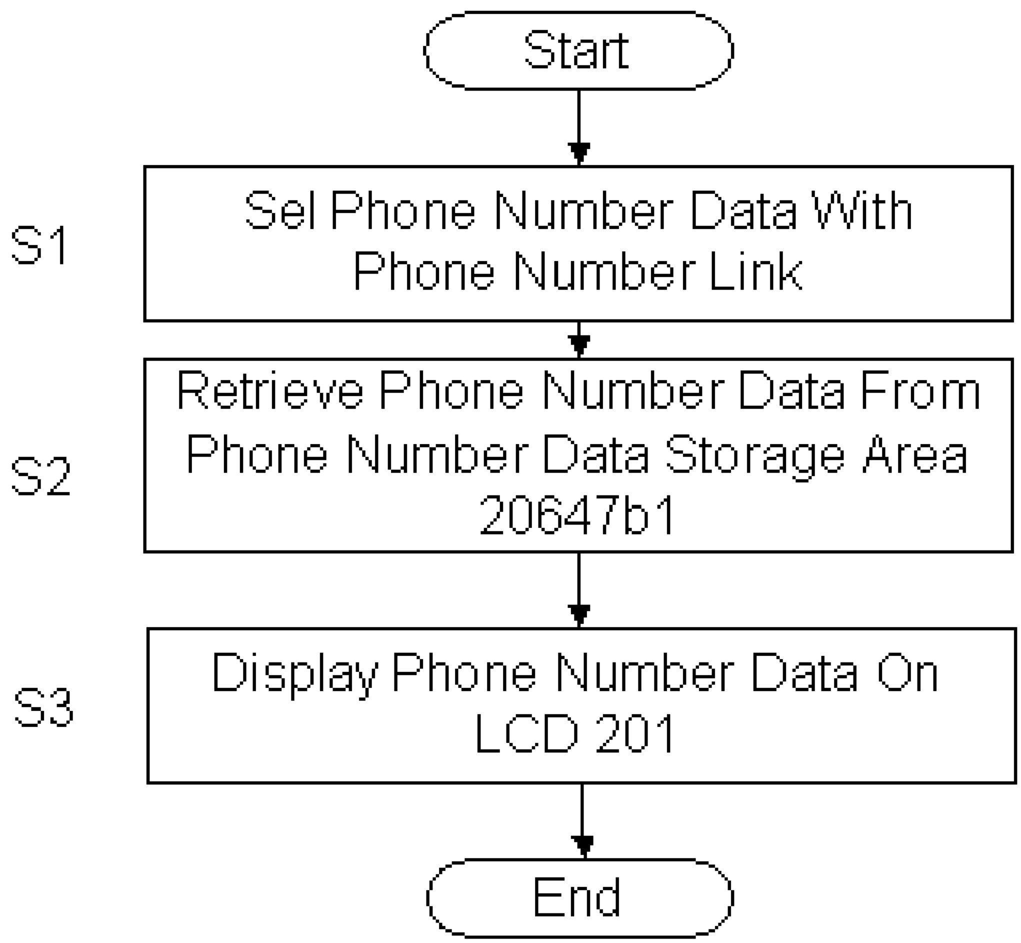

FIG. 976 is a flowchart illustrating an exemplary embodiment of the present invention.

Figure 977:
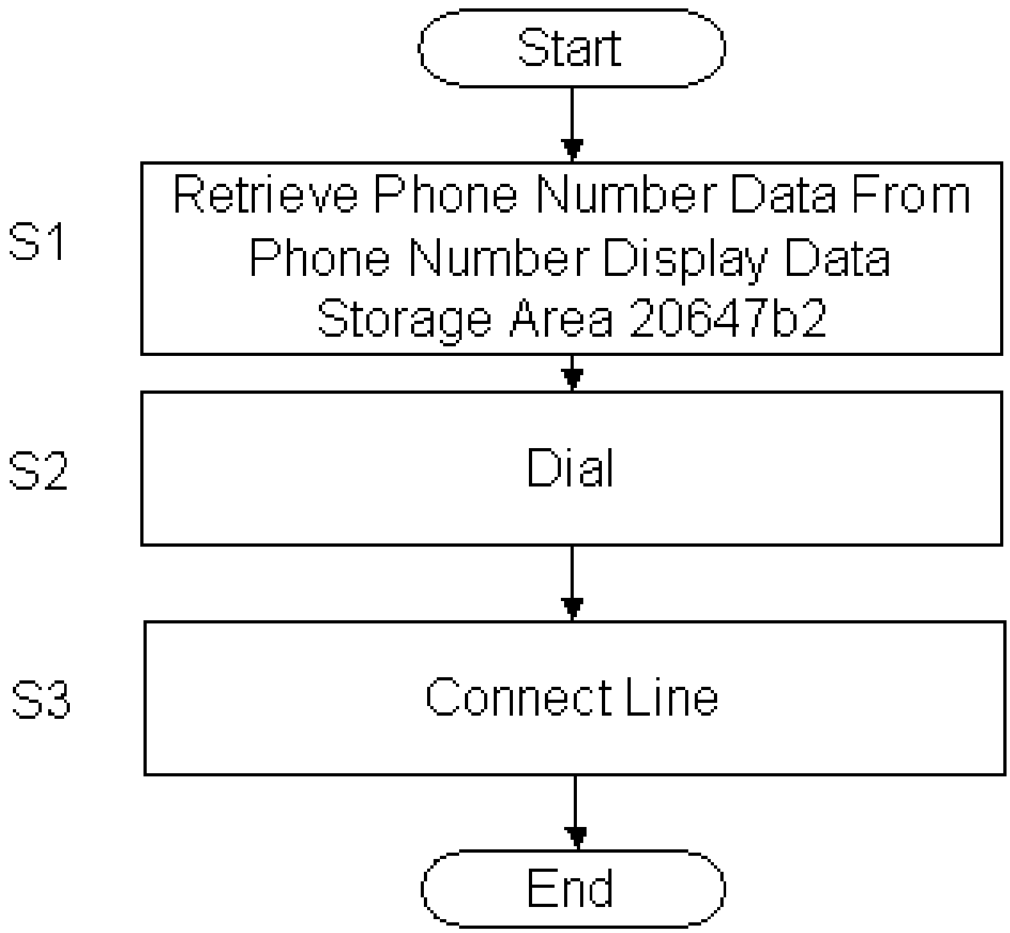

FIG. 977 is a flowchart illustrating an exemplary embodiment of the present invention.

Figure 978:
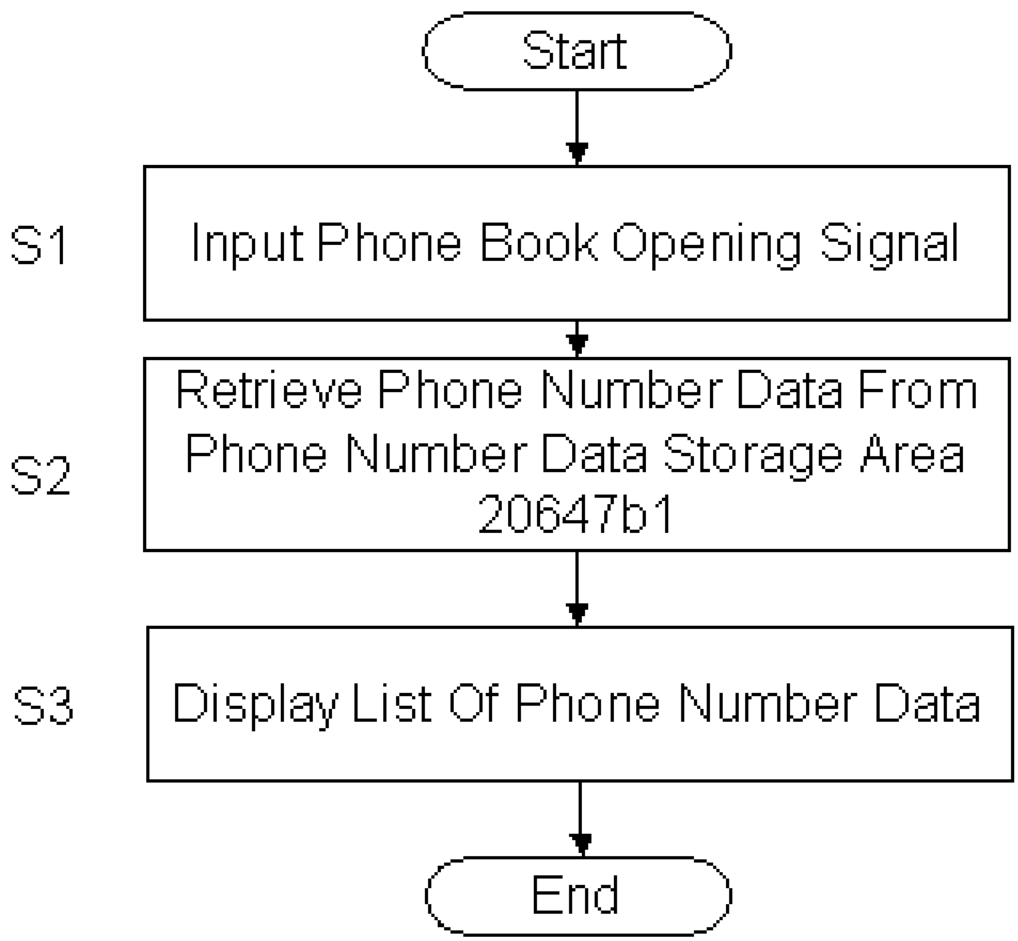

FIG. 978 is a flowchart illustrating an exemplary embodiment of the present invention.

Figure 979:
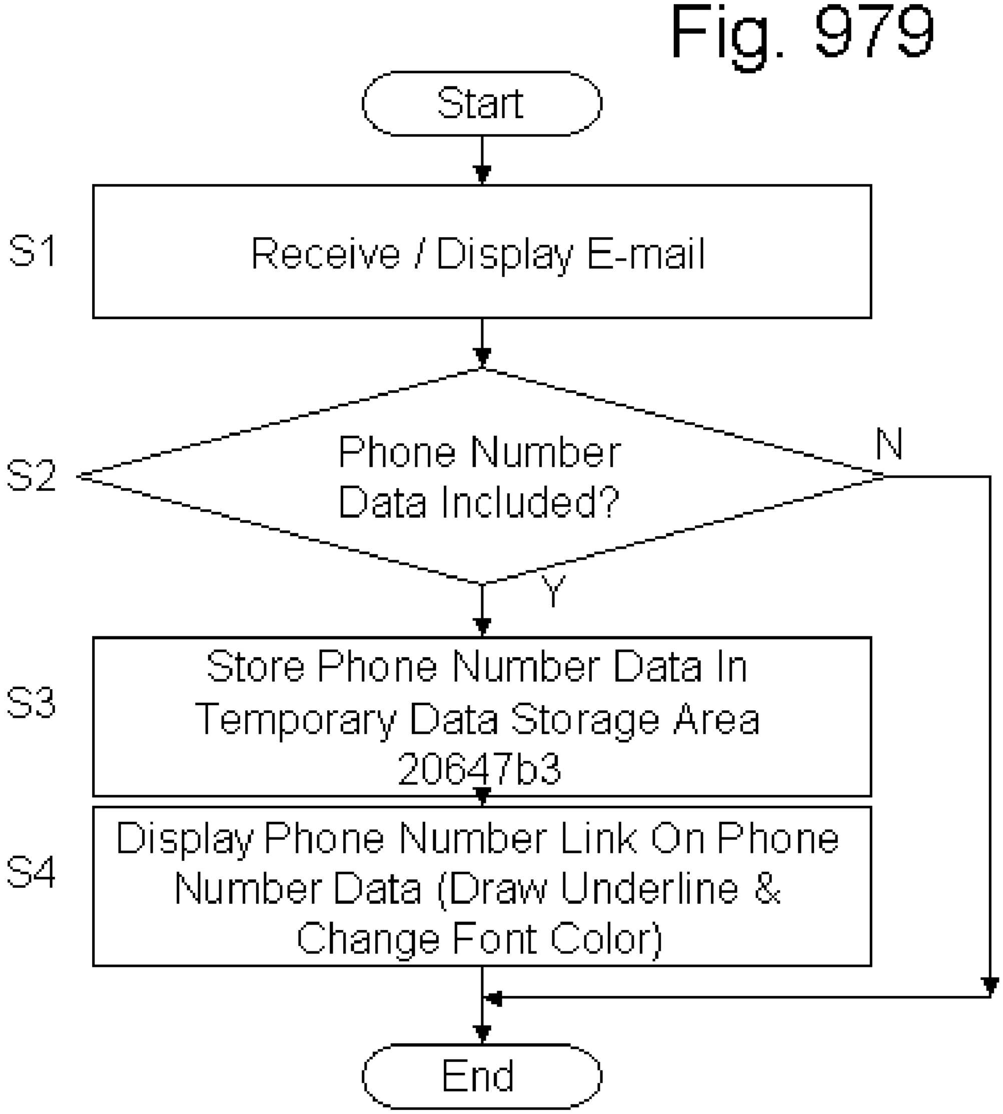

FIG. 979 is a flowchart illustrating an exemplary embodiment of the present invention.

Figure 980:
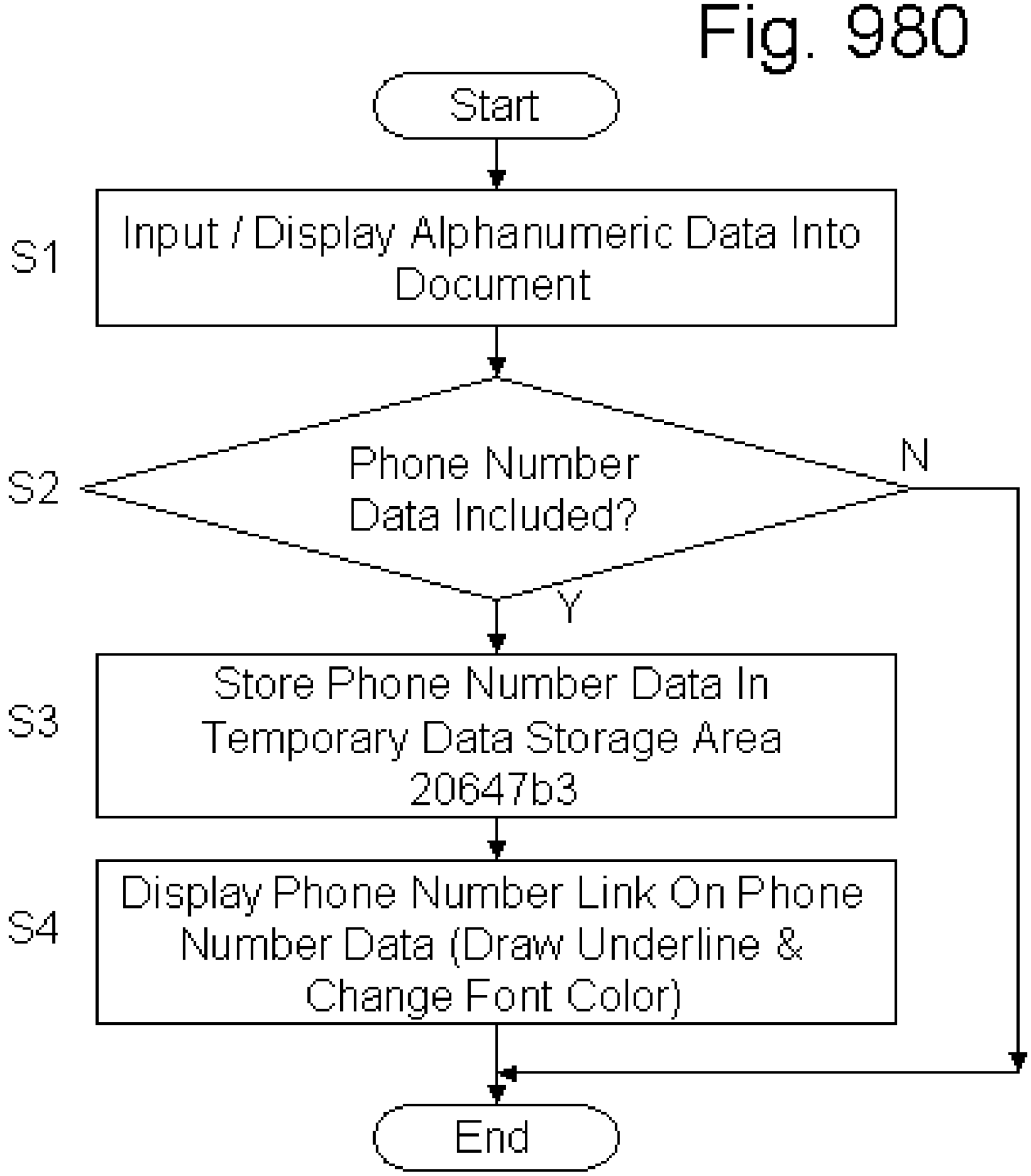

FIG. 980 is a flowchart illustrating an exemplary embodiment of the present invention.

Figure 981:
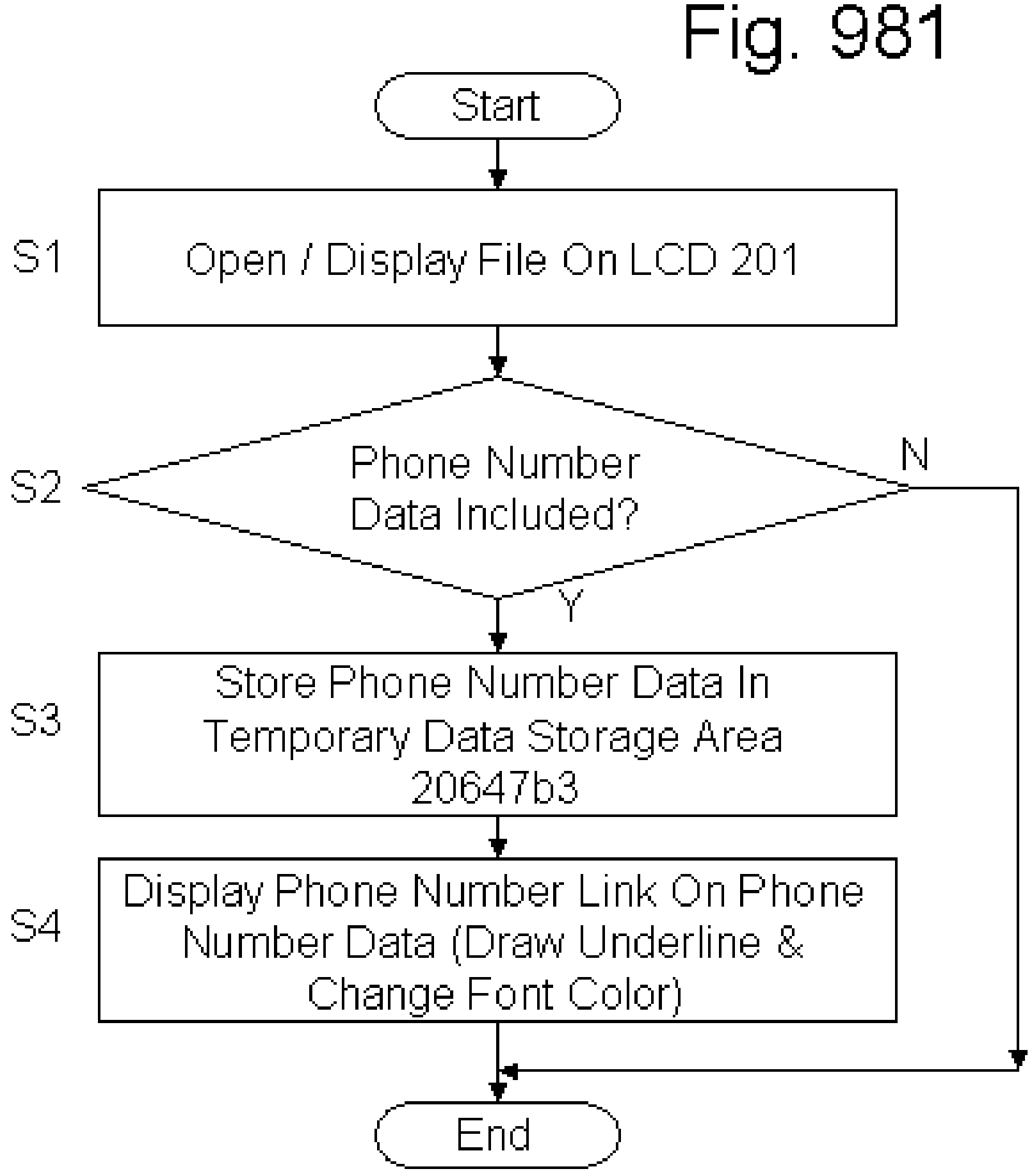

FIG. 981 is a flowchart illustrating an exemplary embodiment of the present invention.

Figure 982:
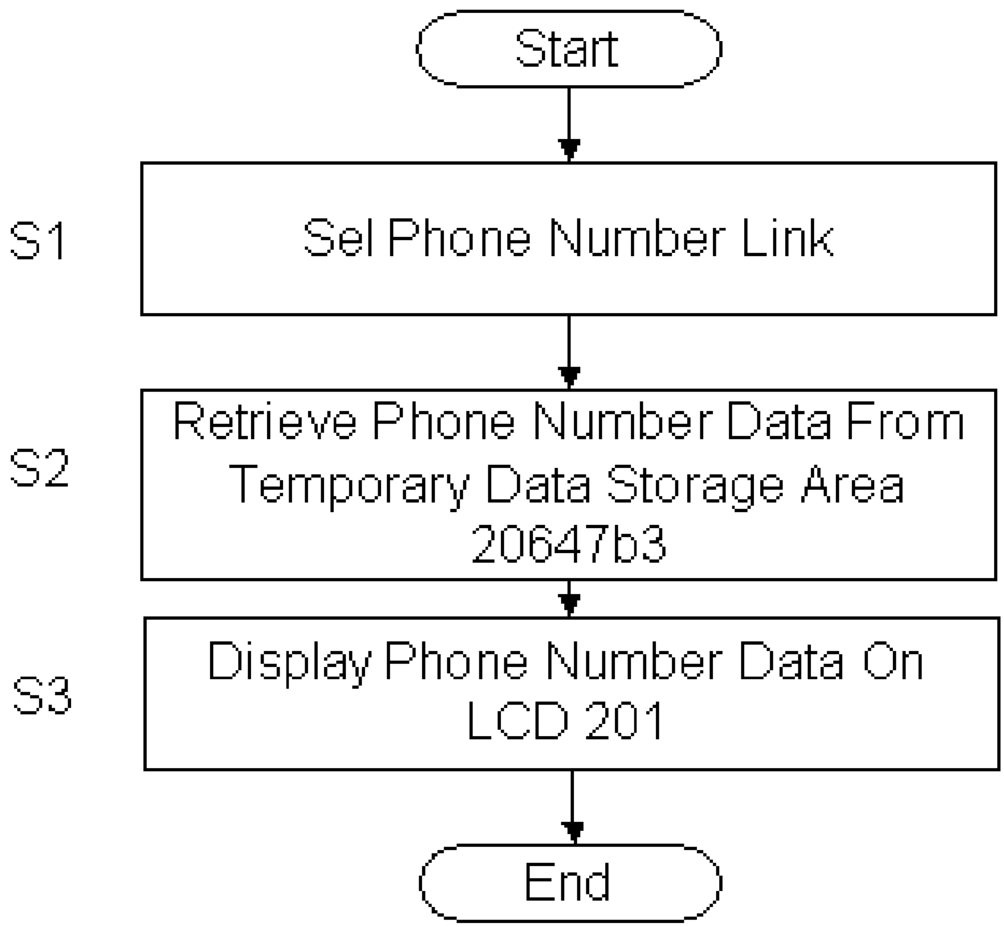

FIG. 982 is a flowchart illustrating an exemplary embodiment of the present invention.

Figure 983:
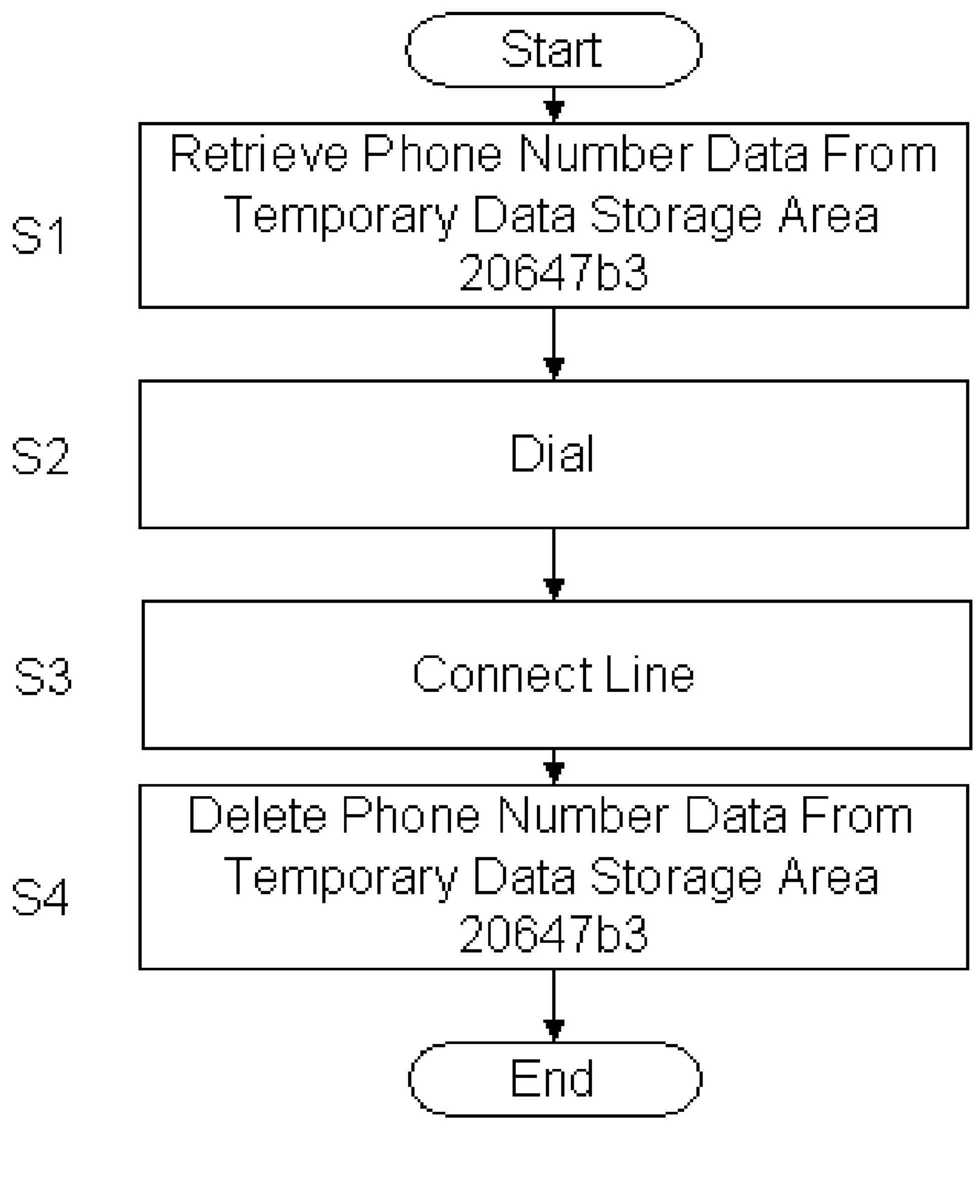

FIG. 983 is a flowchart illustrating an exemplary embodiment of the present invention.

Figure 984:
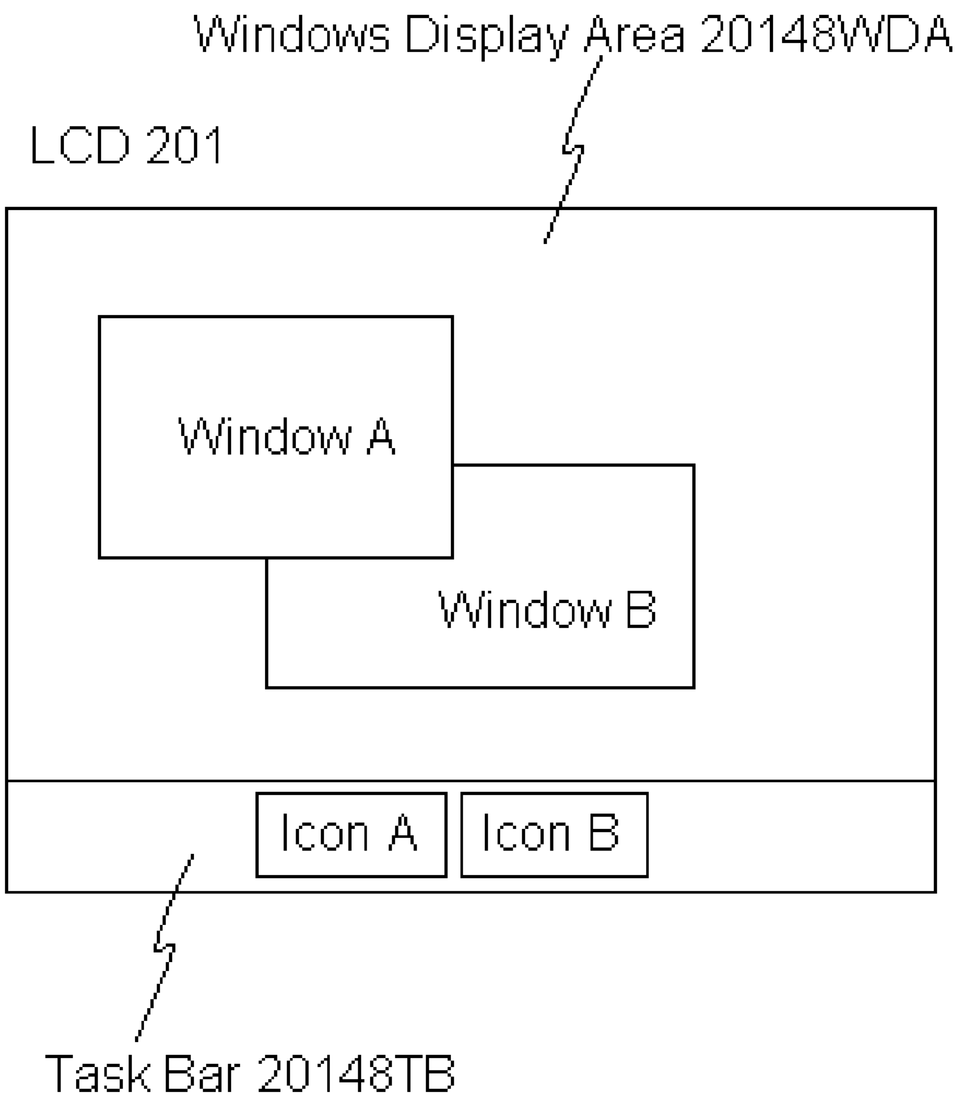

FIG. 984 is a simplified illustration illustrating an exemplary embodiment of the present invention.

Figure 985:
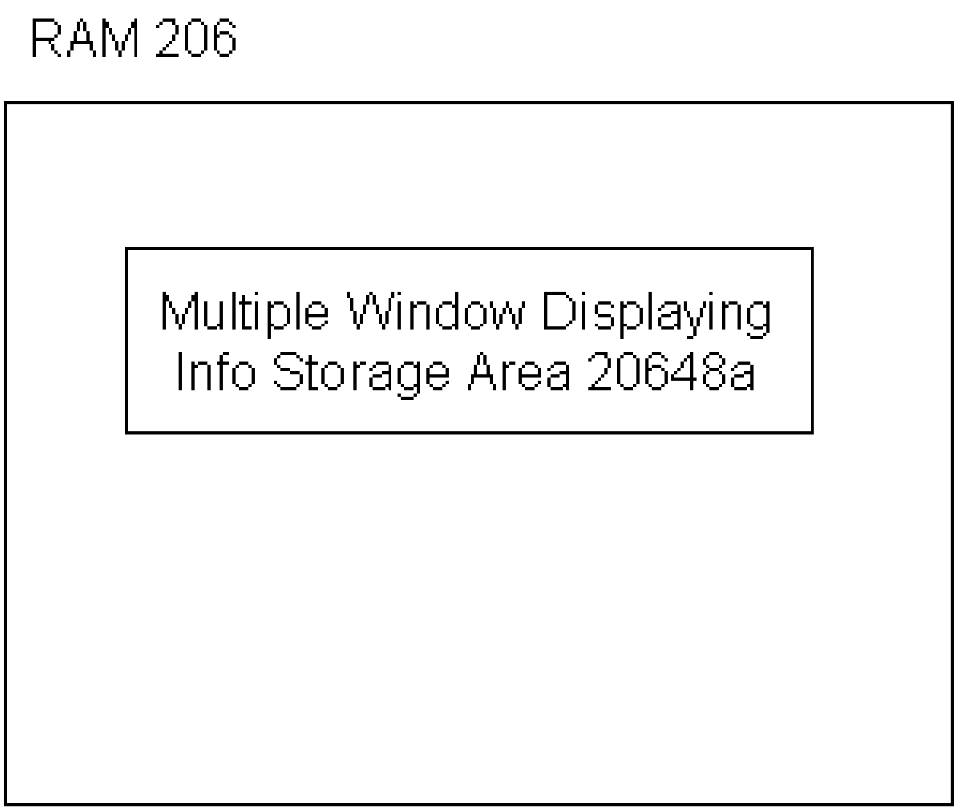

FIG. 985 is a block diagram illustrating an exemplary embodiment of the present invention.

Figure 986:
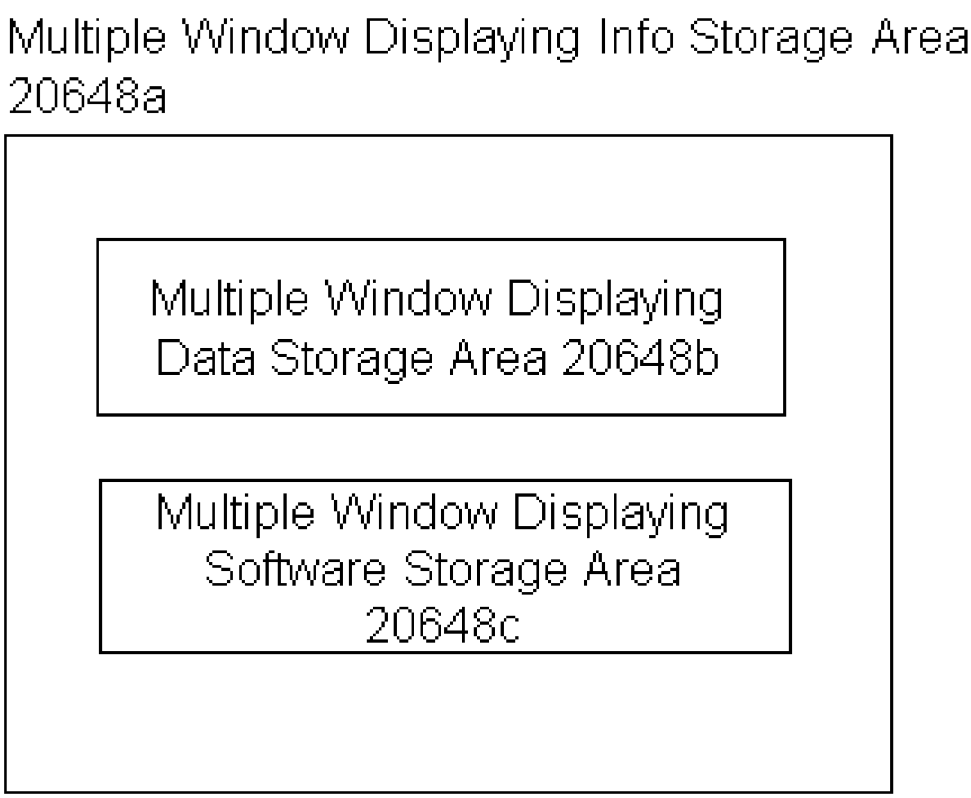

FIG. 986 is a block diagram illustrating an exemplary embodiment of the present invention.

Figure 987:
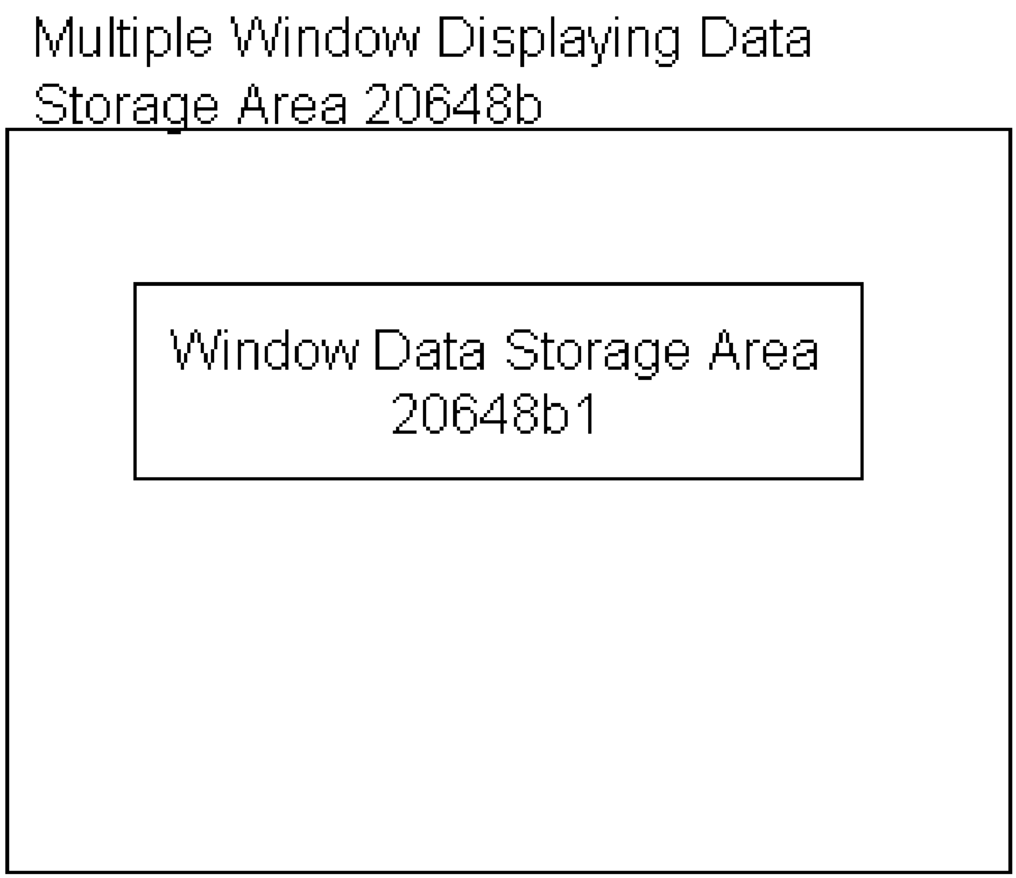

FIG. 987 is a block diagram illustrating an exemplary embodiment of the present invention.

Figure 988:
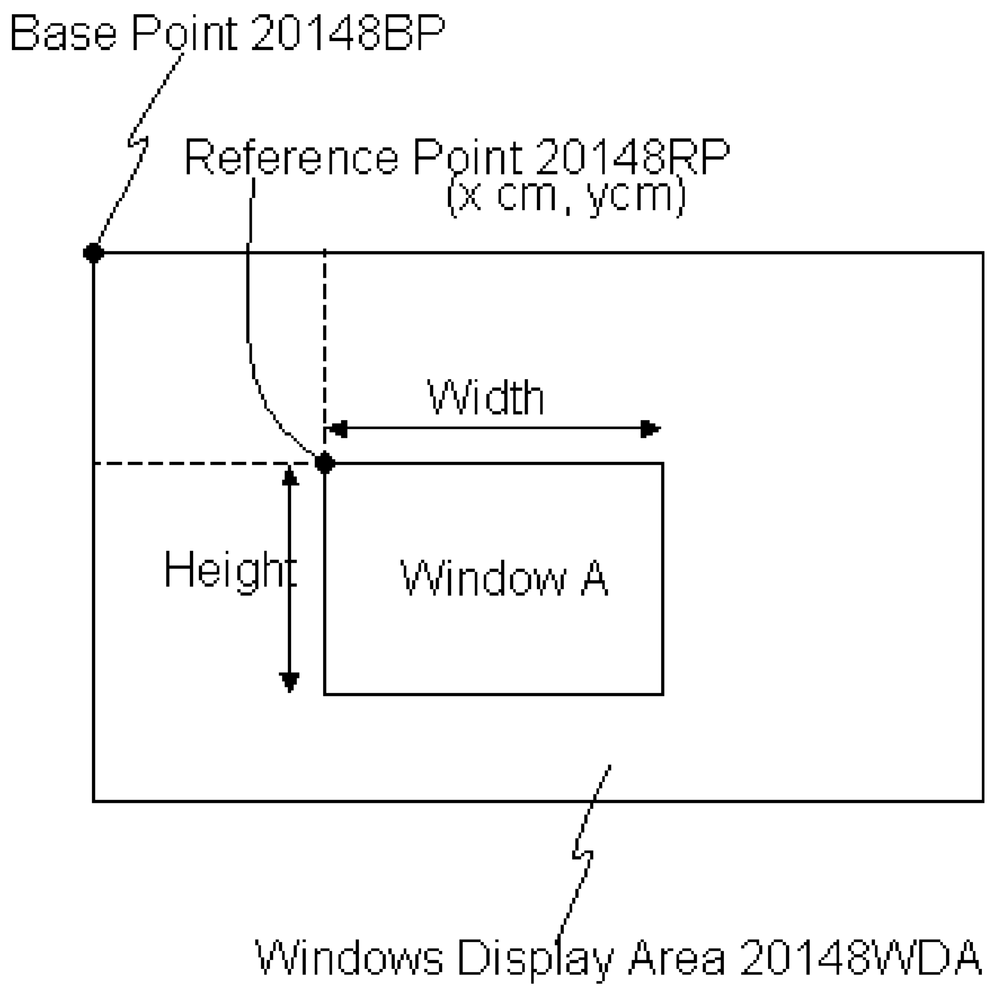

FIG. 988 is a simplified illustration illustrating an exemplary embodiment of the present invention.

FIG. 989 is a block diagram illustrating an exemplary embodiment of the present invention.

Figure 990:
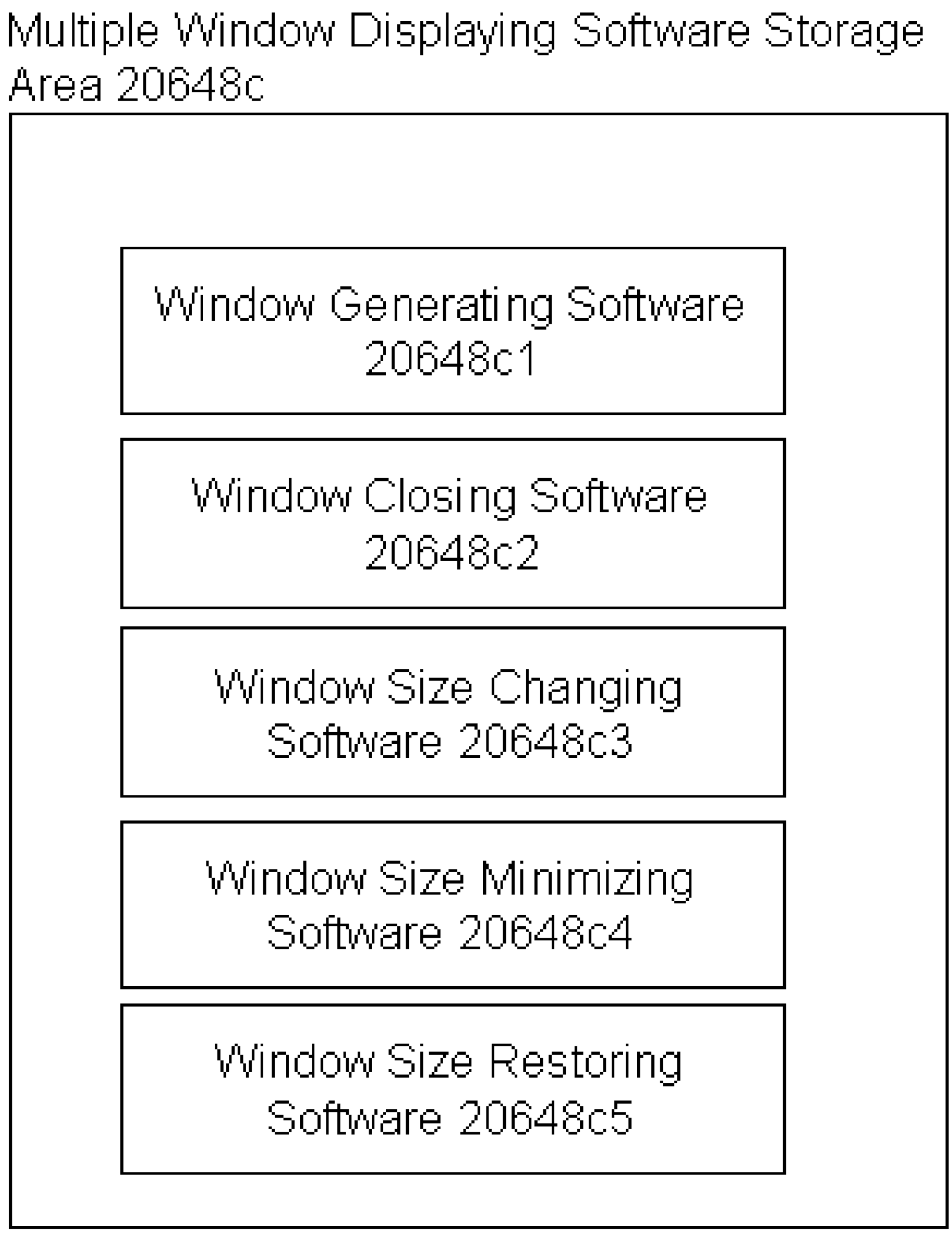

FIG. 990 is a block diagram illustrating an exemplary embodiment of the present invention.

Figure 991:
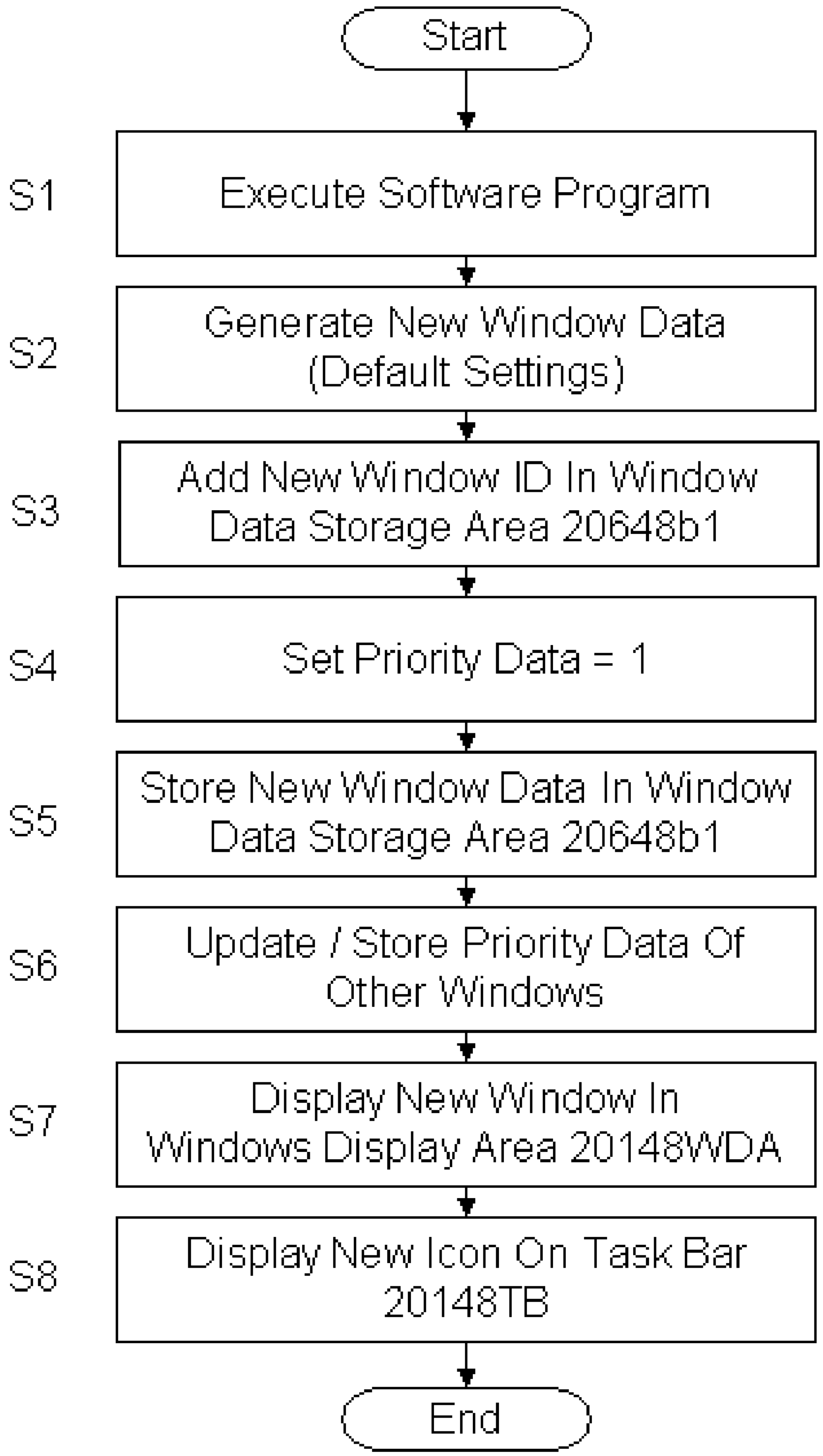

FIG. 991 is a flowchart illustrating an exemplary embodiment of the present invention.

Figure 992:
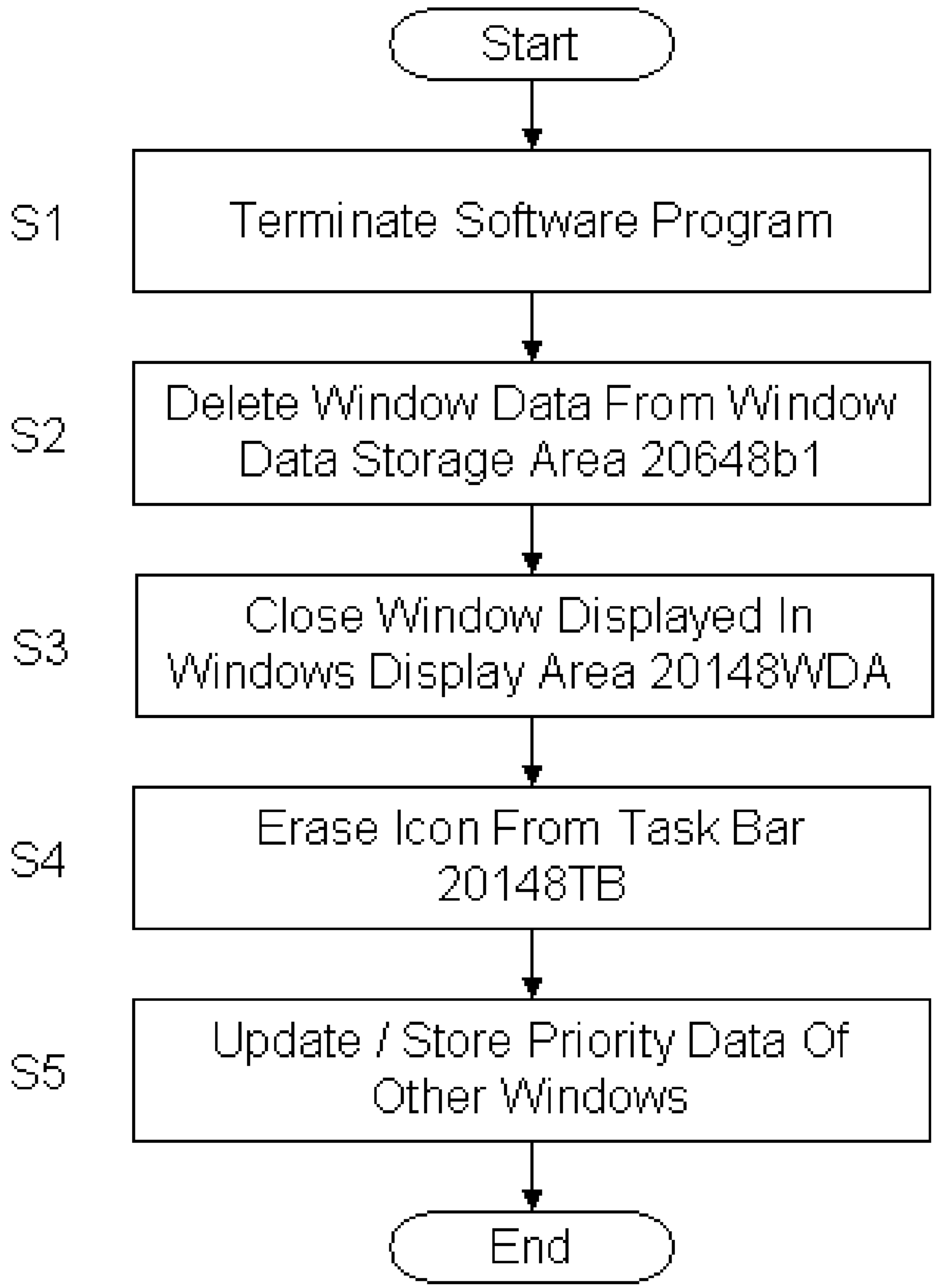

FIG. 992 is a flowchart illustrating an exemplary embodiment of the present invention.

Figure 993:
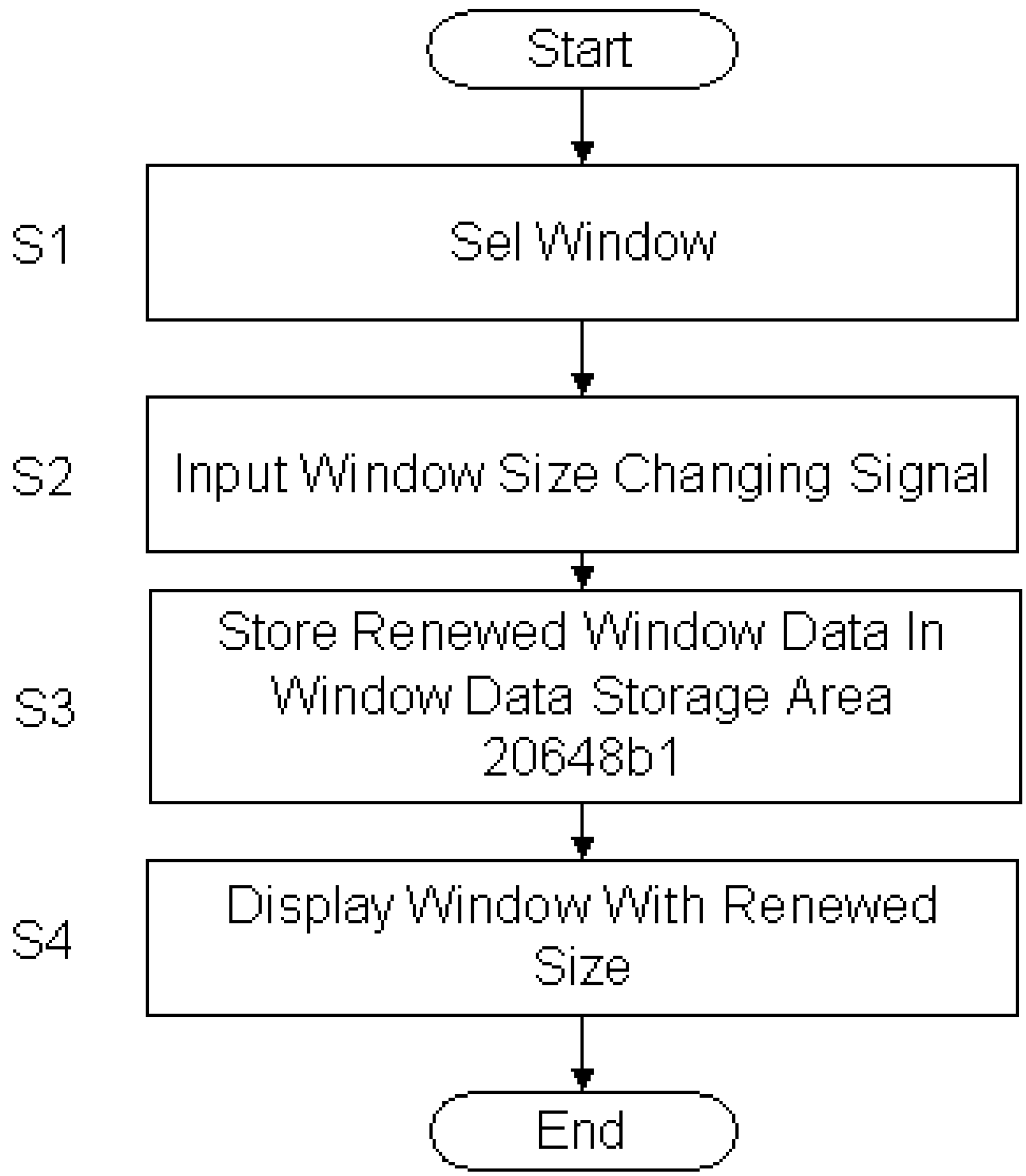

FIG. 993 is a flowchart illustrating an exemplary embodiment of the present invention.

Figure 994:
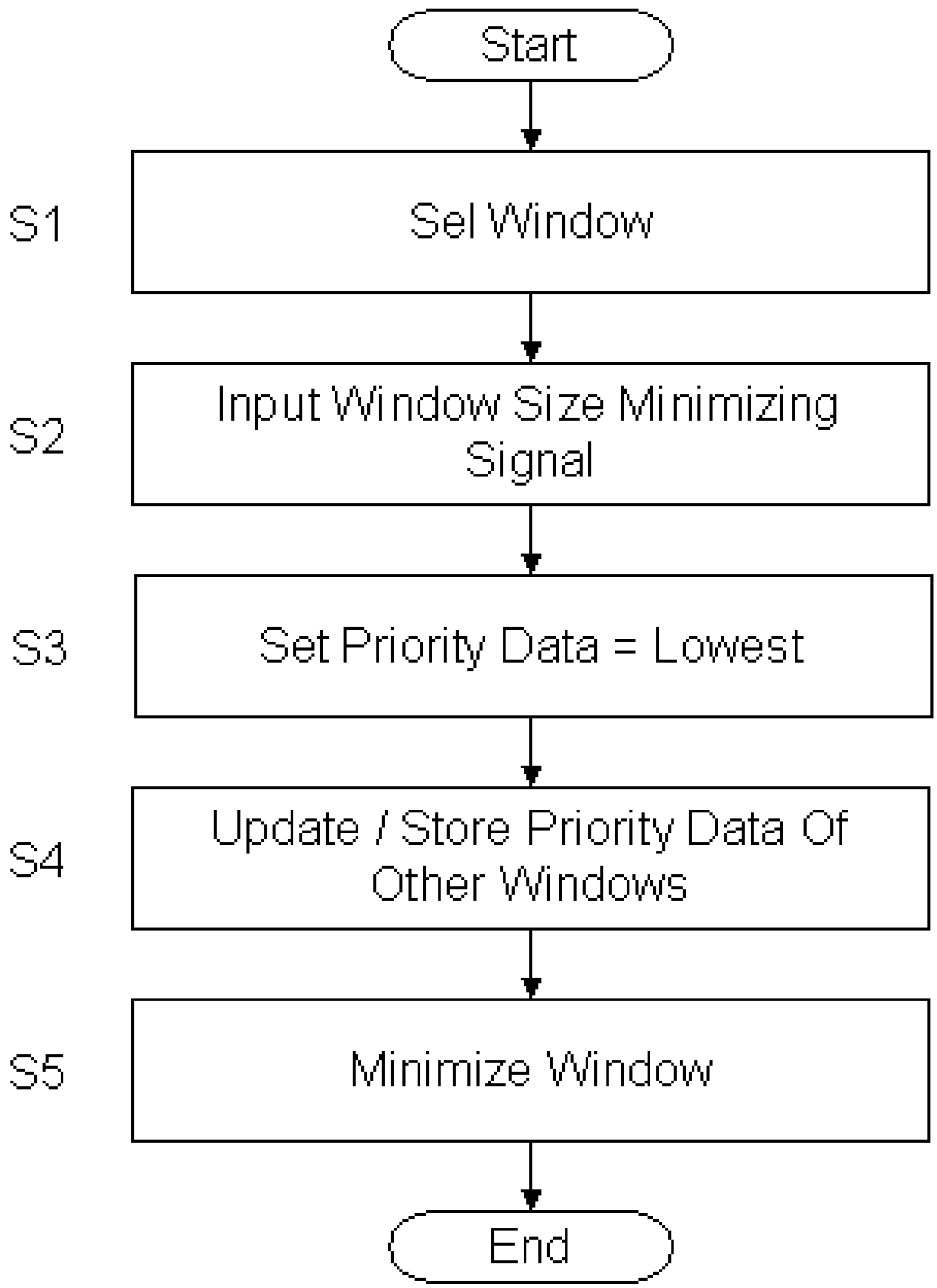

FIG. 994 is a flowchart illustrating an exemplary embodiment of the present invention.

Figure 995:
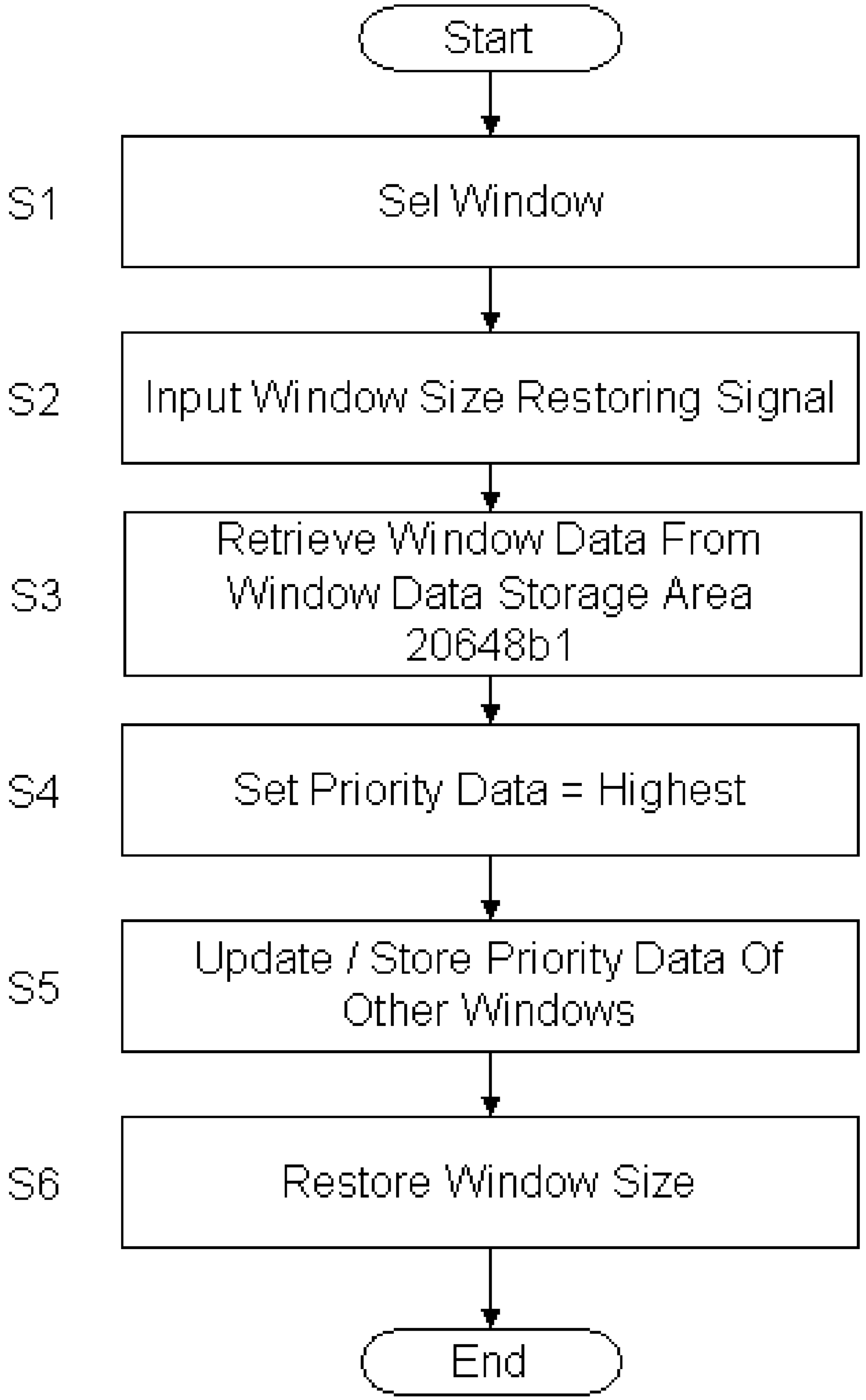

FIG. 995 is a flowchart illustrating an exemplary embodiment of the present invention.

Figure 996:
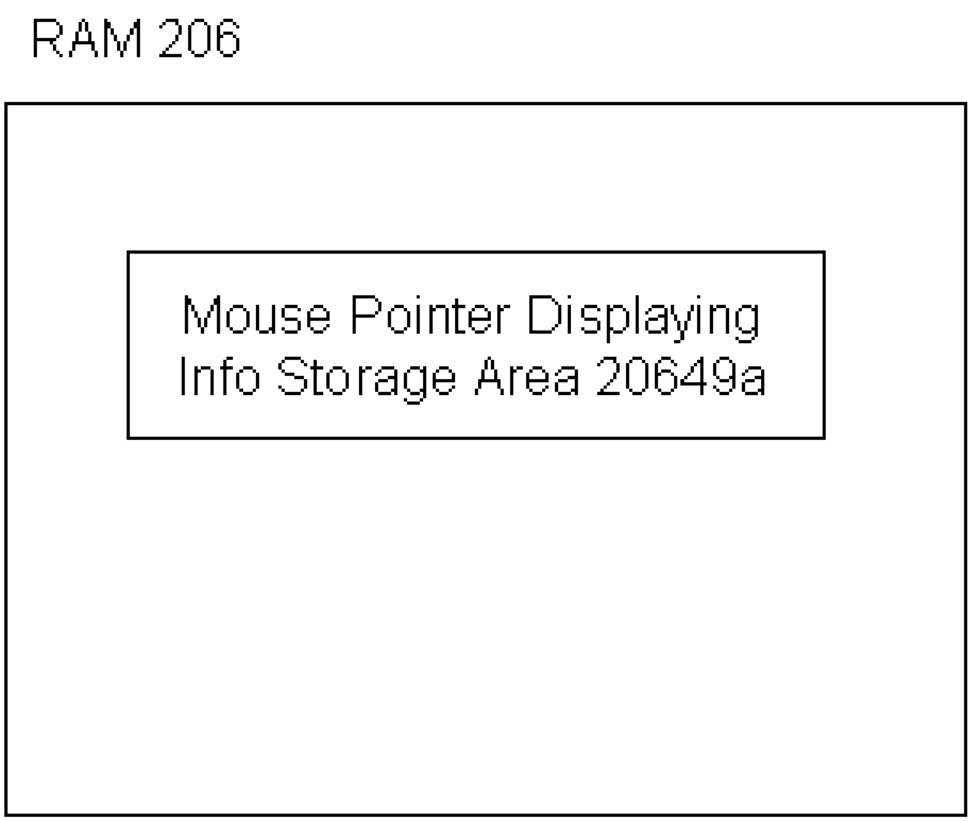

FIG. 996 is a block diagram illustrating an exemplary embodiment of the present invention.

Figure 997:
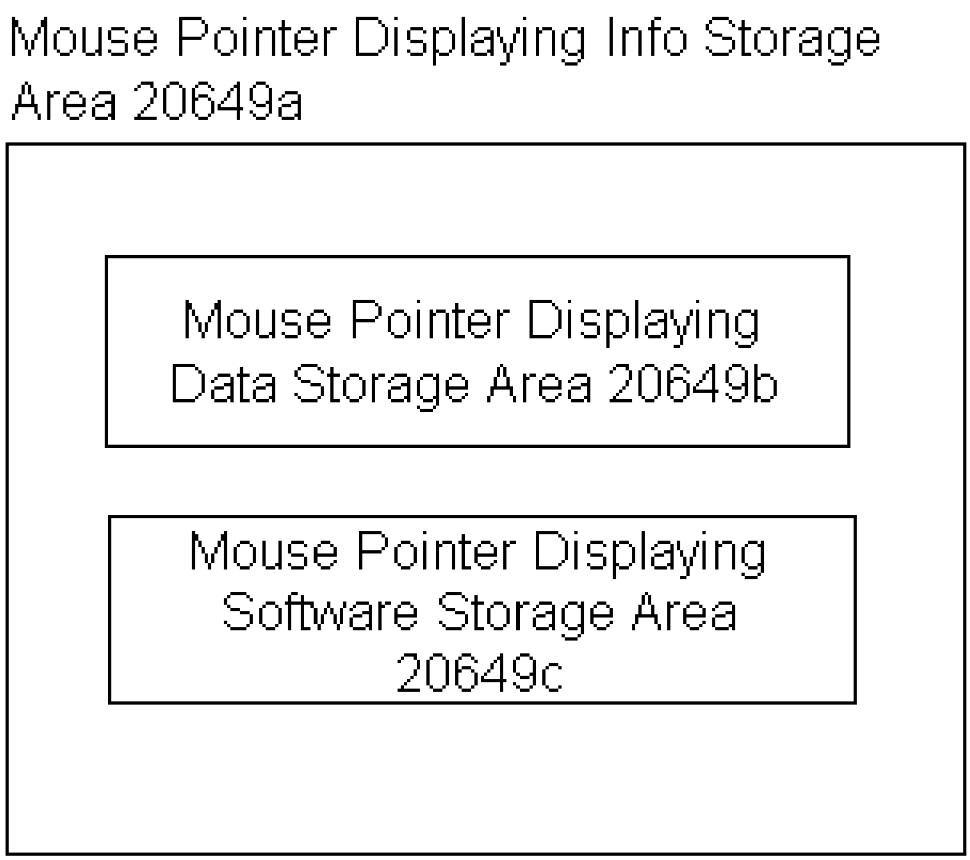

FIG. 997 is a block diagram illustrating an exemplary embodiment of the present invention.

Figure 998:
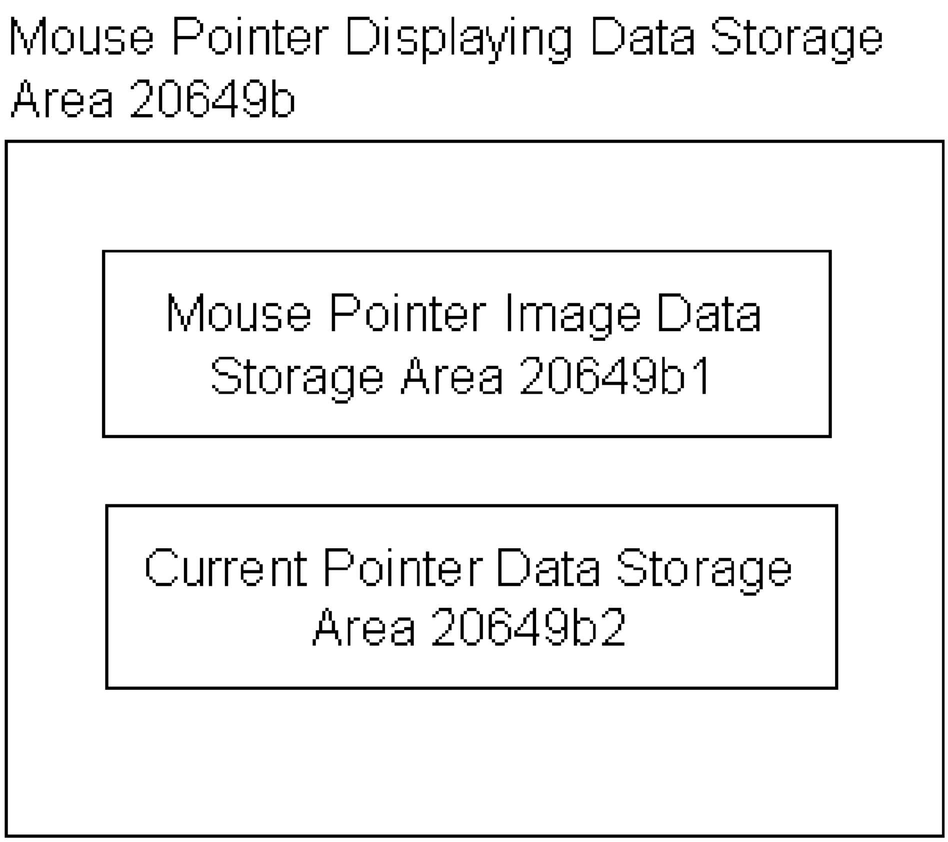

FIG. 998 is a block diagram illustrating an exemplary embodiment of the present invention.

FIG. 999 is a block diagram illustrating an exemplary embodiment of the present invention.

FIG. 1000 is a block diagram illustrating an exemplary embodiment of the present invention.

FIG. 1001 is a block diagram illustrating an exemplary embodiment of the present invention.

FIG. 1002 is a flowchart illustrating an exemplary embodiment of the present invention.

FIG. 1003 is a flowchart illustrating an exemplary embodiment of the present invention.

FIG. 1004 is a flowchart illustrating an exemplary embodiment of the present invention.

FIG. 1005 is a flowchart illustrating an exemplary embodiment of the present invention.

FIG. 1006 is a flowchart illustrating an exemplary embodiment of the present invention.

FIG. 1007 is a flowchart illustrating an exemplary embodiment of the present invention.

FIG. 1008 is a flowchart illustrating an exemplary embodiment of the present invention.

FIG. 1009 is a flowchart illustrating an exemplary embodiment of the present invention.

FIG. 1010 is a flowchart illustrating an exemplary embodiment of the present invention.

FIG. 1011 is a flowchart illustrating an exemplary embodiment of the present invention.

FIG. 1012 is a flowchart illustrating an exemplary embodiment of the present invention.

FIG. 1013 is a flowchart illustrating an exemplary embodiment of the present invention.

FIG. 1014 is a flowchart illustrating an exemplary embodiment of the present invention.

FIG. 1015 is a flowchart illustrating an exemplary embodiment of the present invention.

FIG. 1016 is a flowchart illustrating an exemplary embodiment of the present invention.

FIG. 1017 is a flowchart illustrating an exemplary embodiment of the present invention.

FIG. 1018 is a flowchart illustrating an exemplary embodiment of the present invention.

FIG. 1019 is a flowchart illustrating an exemplary embodiment of the present invention.

FIG. 1020 is a flowchart illustrating an exemplary embodiment of the present invention.

FIG. 1021 is a flowchart illustrating an exemplary embodiment of the present invention.

FIG. 1022 is a block diagram illustrating an exemplary embodiment of the present invention.

FIG. 1023 is a block diagram illustrating an exemplary embodiment of the present invention.

FIG. 1024 is a block diagram illustrating an exemplary embodiment of the present invention.

FIG. 1025 is a block diagram illustrating an exemplary embodiment of the present invention.

FIG. 1026 is a simplified illustration illustrating an exemplary embodiment of the present invention.

FIG. 1027 is a simplified illustration illustrating an exemplary embodiment of the present invention.

FIG. 1028 is a simplified illustration illustrating an exemplary embodiment of the present invention.

FIG. 1029 is a simplified illustration illustrating an exemplary embodiment of the present invention.

FIG. 1030 is a simplified illustration illustrating an exemplary embodiment of the present invention.

FIG. 1031 is a simplified illustration illustrating an exemplary embodiment of the present invention.

FIG. 1032 is a simplified illustration illustrating an exemplary embodiment of the present invention.

FIG. 1033 is a simplified illustration illustrating an exemplary embodiment of the present invention.

FIG. 1034 is a simplified illustration illustrating an exemplary embodiment of the present invention.

FIG. 1035 is a simplified illustration illustrating an exemplary embodiment of the present invention.

FIG. 1036 is a simplified illustration illustrating an exemplary embodiment of the present invention.

FIG. 1037 is a simplified illustration illustrating an exemplary embodiment of the present invention.

FIG. 1038 is a block diagram illustrating an exemplary embodiment of the present invention.

FIG. 1039 is a block diagram illustrating an exemplary embodiment of the present invention.

FIG. 1040 is a block diagram illustrating an exemplary embodiment of the present invention.

FIG. 1041 is a block diagram illustrating an exemplary embodiment of the present invention.

FIG. 1042 is a block diagram illustrating an exemplary embodiment of the present invention.

FIG. 1043 is a block diagram illustrating an exemplary embodiment of the present invention.

FIG. 1044 is a block diagram illustrating an exemplary embodiment of the present invention.

FIG. 1045 is a block diagram illustrating an exemplary embodiment of the present invention.

FIG. 1046 is a block diagram illustrating an exemplary embodiment of the present invention.

FIG. 1047 is a block diagram illustrating an exemplary embodiment of the present invention.

FIG. 1048 is a block diagram illustrating an exemplary embodiment of the present invention.

FIG. 1049 is a block diagram illustrating an exemplary embodiment of the present invention.

FIG. 1050 is a block diagram illustrating an exemplary embodiment of the present invention.

FIG. 1051 is a block diagram illustrating an exemplary embodiment of the present invention.

FIG. 1052 is a block diagram illustrating an exemplary embodiment of the present invention.

FIG. 1053 is a block diagram illustrating an exemplary embodiment of the present invention.

FIG. 1054 is a block diagram illustrating an exemplary embodiment of the present invention.

FIG. 1055 is a block diagram illustrating an exemplary embodiment of the present invention.

FIG. 1056 is a block diagram illustrating an exemplary embodiment of the present invention.

FIG. 1057 is a block diagram illustrating an exemplary embodiment of the present invention.

FIG. 1058 is a block diagram illustrating an exemplary embodiment of the present invention.

FIG. 1059 is a block diagram illustrating an exemplary embodiment of the present invention.

FIG. 1060 is a flowchart illustrating an exemplary embodiment of the present invention.

FIG. 1061 is a simplified illustration of data utilized in the present invention.

FIG. 1062 is a flowchart illustrating an exemplary embodiment of the present invention.

FIG. 1063 is a flowchart illustrating an exemplary embodiment of the present invention.

FIG. 1064 is a flowchart illustrating an exemplary embodiment of the present invention.

FIG. 1065 is a simplified illustration of data utilized in the present invention.

FIG. 1066 is a flowchart illustrating an exemplary embodiment of the present invention.

FIG. 1067 is a flowchart illustrating an exemplary embodiment of the present invention.

FIG. 1068 is a flowchart illustrating an exemplary embodiment of the present invention.

FIG. 1069 is a flowchart illustrating an exemplary embodiment of the present invention.

FIG. 1070 is a flowchart illustrating an exemplary embodiment of the present invention.

FIG. 1071 is a flowchart illustrating an exemplary embodiment of the present invention.

FIG. 1072 is a flowchart illustrating an exemplary embodiment of the present invention.

FIG. 1073 is a flowchart illustrating an exemplary embodiment of the present invention.

FIG. 1074 is a flowchart illustrating an exemplary embodiment of the present invention.

FIG. 1075 is a flowchart illustrating an exemplary embodiment of the present invention.

FIG. 1076 is a flowchart illustrating an exemplary embodiment of the present invention.

FIG. 1077 is a flowchart illustrating an exemplary embodiment of the present invention.

FIG. 1078 is a flowchart illustrating an exemplary embodiment of the present invention.

FIG. 1079 is a flowchart illustrating an exemplary embodiment of the present invention.

FIG. 1080 is a flowchart illustrating an exemplary embodiment of the present invention.

FIG. 1081 is a flowchart illustrating an exemplary embodiment of the present invention.

FIG. 1082 is a block diagram illustrating an exemplary embodiment of the present invention.

FIG. 1083 is a block diagram illustrating an exemplary embodiment of the present invention.

FIG. 1084 is a flowchart illustrating an exemplary embodiment of the present invention.

FIG. 1085 is a block diagram illustrating an exemplary embodiment of the present invention.

FIG. 1086 is a flowchart illustrating an exemplary embodiment of the present invention.

FIG. 1087 is a flowchart illustrating an exemplary embodiment of the present invention.

FIG. 1088 is a flowchart illustrating an exemplary embodiment of the present invention.

FIG. 1089 is a flowchart illustrating an exemplary embodiment of the present invention.

FIG. 1090 is a flowchart illustrating an exemplary embodiment of the present invention.

FIG. 1091 is a flowchart illustrating an exemplary embodiment of the present invention.

FIG. 1092 is a flowchart illustrating an exemplary embodiment of the present invention.

FIG. 1093 is a flowchart illustrating an exemplary embodiment of the present invention.

FIG. 1094 is a flowchart illustrating an exemplary embodiment of the present invention.

FIG. 1095 is a flowchart illustrating an exemplary embodiment of the present invention.

FIG. 1096 is a flowchart illustrating an exemplary embodiment of the present invention.

FIG. 1097 is a flowchart illustrating an exemplary embodiment of the present invention.

FIG. 1098 is a flowchart illustrating an exemplary embodiment of the present invention.

FIG. 1099 is a flowchart illustrating an exemplary embodiment of the present invention.

FIG. 1100 is a flowchart illustrating an exemplary embodiment of the present invention.

FIG. 1101 is a flowchart illustrating an exemplary embodiment of the present invention.

FIG. 1102 is a flowchart illustrating an exemplary embodiment of the present invention.

FIG. 1103 is a block diagram illustrating an exemplary embodiment of the present invention.

FIG. 1104 is a block diagram illustrating an exemplary embodiment of the present invention.

FIG. 1105 is a block diagram illustrating an exemplary embodiment of the present invention.

FIG. 1106 is a flowchart illustrating an exemplary embodiment of the present invention.

FIG. 1107 is a simplified illustration of data utilized in the present invention.

FIG. 1108 is a flowchart illustrating an exemplary embodiment of the present invention.

FIG. 1109 is a flowchart illustrating an exemplary embodiment of the present invention.

FIG. 1110 is a flowchart illustrating an exemplary embodiment of the present invention.

FIG. 1111 is a flowchart illustrating an exemplary embodiment of the present invention.

FIG. 1112 is a flowchart illustrating an exemplary embodiment of the present invention.

FIG. 1113 is a flowchart illustrating an exemplary embodiment of the present invention.

FIG. 1114 is a flowchart illustrating an exemplary embodiment of the present invention.

FIG. 1115 is a flowchart illustrating an exemplary embodiment of the present invention.

FIG. 1116 is a simplified illustration of data utilized in the present invention.

FIG. 1117 is a flowchart illustrating an exemplary embodiment of the present invention.

FIG. 1118 is a flowchart illustrating an exemplary embodiment of the present invention.

FIG. 1119 is a flowchart illustrating an exemplary embodiment of the present invention.

FIG. 1120 is a flowchart illustrating an exemplary embodiment of the present invention.

FIG. 1121 is a flowchart illustrating an exemplary embodiment of the present invention.

FIG. 1122 is a flowchart illustrating an exemplary embodiment of the present invention.

FIG. 1123 is a flowchart illustrating an exemplary embodiment of the present invention.

FIG. 1124 is a flowchart illustrating an exemplary embodiment of the present invention.

FIG. 1125 is a simplified illustration of data utilized in the present invention.

FIG. 1126 is a flowchart illustrating an exemplary embodiment of the present invention.

FIG. 1127 is a flowchart illustrating an exemplary embodiment of the present invention.

FIG. 1128 is a flowchart illustrating an exemplary embodiment of the present invention.

FIG. 1129 is a block diagram illustrating an exemplary embodiment of the present invention.

FIG. 1130 is a block diagram illustrating an exemplary embodiment of the present invention.

FIG. 1131 is a block diagram illustrating an exemplary embodiment of the present invention.

FIG. 1131*a* is a block diagram illustrating an exemplary embodiment of the present invention.

FIG. 1132 is a flowchart illustrating an exemplary embodiment of the present invention.

FIG. 1133 is a simplified illustration of data utilized in the present invention.

FIG. 1134 is a flowchart illustrating an exemplary embodiment of the present invention.

FIG. 1135 is a flowchart illustrating an exemplary embodiment of the present invention.

FIG. 1136 is a flowchart illustrating an exemplary embodiment of the present invention.

FIG. 1137 is a flowchart illustrating an exemplary embodiment of the present invention.

FIG. 1138 is a flowchart illustrating an exemplary embodiment of the present invention.

FIG. 1139 is a flowchart illustrating an exemplary embodiment of the present invention.

FIG. 1140 is a flowchart illustrating an exemplary embodiment of the present invention.

FIG. 1141 is a simplified illustration of data utilized in the present invention.

FIG. 1142 is a flowchart illustrating an exemplary embodiment of the present invention.

FIG. 1143 is a flowchart illustrating an exemplary embodiment of the present invention.

FIG. 1144 is a flowchart illustrating an exemplary embodiment of the present invention.

FIG. 1145 is a flowchart illustrating an exemplary embodiment of the present invention.

FIG. 1146 is a flowchart illustrating an exemplary embodiment of the present invention.

FIG. 1147 is a flowchart illustrating an exemplary embodiment of the present invention.

FIG. 1148 is a simplified illustration of data utilized in the present invention.

FIG. 1149 is a flowchart illustrating an exemplary embodiment of the present invention.

FIG. 1150 is a flowchart illustrating an exemplary embodiment of the present invention.

FIG. 1151 is a block diagram illustrating an exemplary embodiment of the present invention.

FIG. 1152 is a block diagram illustrating an exemplary embodiment of the present invention.

FIG. 1153 is a block diagram illustrating an exemplary embodiment of the present invention.

FIG. 1154 is a block diagram illustrating an exemplary embodiment of the present invention.

FIG. 1155 is a block diagram illustrating an exemplary embodiment of the present invention.

FIG. 1156 is a block diagram illustrating an exemplary embodiment of the present invention.

FIG. 1157 is a block diagram illustrating an exemplary embodiment of the present invention.

FIG. 1158 is a block diagram illustrating an exemplary embodiment of the present invention.

FIG. 1159 is a block diagram illustrating an exemplary embodiment of the present invention.

FIG. 1160 is a block diagram illustrating an exemplary embodiment of the present invention.

FIG. 1161 is a block diagram illustrating an exemplary embodiment of the present invention.

FIG. 1162 is a block diagram illustrating an exemplary embodiment of the present invention.

FIG. 1163 is a block diagram illustrating an exemplary embodiment of the present invention.

FIG. 1164 is a block diagram illustrating an exemplary embodiment of the present invention.

FIG. 1165 is a block diagram illustrating an exemplary embodiment of the present invention.

FIG. 1166 is a block diagram illustrating an exemplary embodiment of the present invention.

FIG. 1167 is a block diagram illustrating an exemplary embodiment of the present invention.

FIG. 1168 is a block diagram illustrating an exemplary embodiment of the present invention.

FIG. 1169 is a flowchart illustrating an exemplary embodiment of the present invention.

FIG. 1170 is a flowchart illustrating an exemplary embodiment of the present invention.

FIG. 1171 is a simplified illustration of data utilized in the present invention.

FIG. 1172 is a flowchart illustrating an exemplary embodiment of the present invention.

FIG. 1173 is a flowchart illustrating an exemplary embodiment of the present invention.

FIG. 1174 is a flowchart illustrating an exemplary embodiment of the present invention.

FIG. 1175 is a flowchart illustrating an exemplary embodiment of the present invention.

FIG. 1176 is a flowchart illustrating an exemplary embodiment of the present invention.

FIG. 1177 is a flowchart illustrating an exemplary embodiment of the present invention.

FIG. 1178 is a flowchart illustrating an exemplary embodiment of the present invention.

FIG. 1179 is a simplified illustration of data utilized in the present invention.

FIG. 1180 is a flowchart illustrating an exemplary embodiment of the present invention.

FIG. 1181 is a flowchart illustrating an exemplary embodiment of the present invention.

FIG. 1182 is a flowchart illustrating an exemplary embodiment of the present invention.

FIG. 1183 is a flowchart illustrating an exemplary embodiment of the present invention.

FIG. 1184 is a simplified illustration of data utilized in the present invention.

FIG. 1185 is a flowchart illustrating an exemplary embodiment of the present invention.

FIG. 1186 is a flowchart illustrating an exemplary embodiment of the present invention.

FIG. 1187 is a flowchart illustrating an exemplary embodiment of the present invention.

FIG. 1188 is a flowchart illustrating an exemplary embodiment of the present invention.

FIG. 1189 is a block diagram illustrating an exemplary embodiment of the present invention.

FIG. 1190 is a block diagram illustrating an exemplary embodiment of the present invention.

FIG. 1191 is a block diagram illustrating an exemplary embodiment of the present invention.

FIG. 1192 is a block diagram illustrating an exemplary embodiment of the present invention.

FIG. 1193 is a block diagram illustrating an exemplary embodiment of the present invention.

FIG. 1194 is a block diagram illustrating an exemplary embodiment of the present invention.

FIG. 1195 is a block diagram illustrating an exemplary embodiment of the present invention.

FIG. 1196 is a block diagram illustrating an exemplary embodiment of the present invention.

FIG. 1197 is a block diagram illustrating an exemplary embodiment of the present invention.

FIG. 1198 is a block diagram illustrating an exemplary embodiment of the present invention.

FIG. 1199 is a block diagram illustrating an exemplary embodiment of the present invention.

FIG. 1200 is a block diagram illustrating an exemplary embodiment of the present invention.

FIG. 1201 is a block diagram illustrating an exemplary embodiment of the present invention.

FIG. 1202 is a block diagram illustrating an exemplary embodiment of the present invention.

FIG. 1203 is a block diagram illustrating an exemplary embodiment of the present invention.

FIG. 1204 is a block diagram illustrating an exemplary embodiment of the present invention.

FIG. 1205 is a block diagram illustrating an exemplary embodiment of the present invention.

FIG. 1206 is a block diagram illustrating an exemplary embodiment of the present invention.

FIG. 1207 is a simplified illustration illustrating an exemplary embodiment of the present invention.

FIG. 1208 is a block diagram illustrating an exemplary embodiment of the present invention.

FIG. 1209 is a block diagram illustrating an exemplary embodiment of the present invention.

FIG. 1210 is a block diagram illustrating an exemplary embodiment of the present invention.

FIG. 1211 is a block diagram illustrating an exemplary embodiment of the present invention.

FIG. 1212 is a block diagram illustrating an exemplary embodiment of the present invention.

FIG. 1213 is a flowchart illustrating an exemplary embodiment of the present invention.

FIG. 1214 is a flowchart illustrating an exemplary embodiment of the present invention.

FIG. 1215 is a flowchart illustrating an exemplary embodiment of the present invention.

FIG. 1216 is a flowchart illustrating an exemplary embodiment of the present invention.

FIG. 1217 is a flowchart illustrating an exemplary embodiment of the present invention.

FIG. 1218 is a flowchart illustrating an exemplary embodiment of the present invention.

FIG. 1219 is a flowchart illustrating an exemplary embodiment of the present invention.

FIGS. 1220*a* and 1220*b* are flowcharts illustrating an exemplary embodiment of the present invention.

FIG. 1221 is a flowchart illustrating an exemplary embodiment of the present invention.

FIG. 1221*a* is a flowchart illustrating an exemplary embodiment of the present invention.

FIG. 1221*b* is a flowchart illustrating an exemplary embodiment of the present invention.

FIG. 1222 is a block diagram illustrating an exemplary embodiment of the present invention.

FIG. 1223 is a block diagram illustrating an exemplary embodiment of the present invention.

FIG. 1224*a* is a flowchart illustrating an exemplary embodiment of the present invention.

FIG. 1224*b* is a flowchart illustrating an exemplary embodiment of the present invention.

FIG. 1225 is a flowchart illustrating an exemplary embodiment of the present invention.

FIG. 1225*a* is a flowchart illustrating an exemplary embodiment of the present invention.

FIG. 1225*b* is a flowchart illustrating an exemplary embodiment of the present invention.

FIG. 1226 is a flowchart illustrating an exemplary embodiment of the present invention.

FIG. 1227 is a flowchart illustrating an exemplary embodiment of the present invention.

FIG. 1228 is a flowchart illustrating an exemplary embodiment of the present invention.

FIGS. 1229*a* and 1229*b* are flowcharts illustrating an exemplary embodiment of the present invention.

FIG. 1230 is a flowchart illustrating an exemplary embodiment of the present invention.

FIG. 1231 is a flowchart illustrating an exemplary embodiment of the present invention.

FIG. 1232 is a flowchart illustrating an exemplary embodiment of the present invention.

FIG. 1233 is a flowchart illustrating an exemplary embodiment of the present invention.

FIG. 1234*a* is a flowchart illustrating an exemplary embodiment of the present invention.

FIG. 1234*b* is a flowchart illustrating an exemplary embodiment of the present invention.

FIG. 1235 is a block diagram illustrating an exemplary embodiment of the present invention.

FIG. 1236 is a block diagram illustrating an exemplary embodiment of the present invention.

FIG. 1237 is a block diagram illustrating an exemplary embodiment of the present invention.

FIG. 1238 is a block diagram illustrating an exemplary embodiment of the present invention.

FIG. 1239 is a block diagram illustrating an exemplary embodiment of the present invention.

FIG. 1240*a* is a flowchart illustrating an exemplary embodiment of the present invention.

FIG. 1240*b* is a flowchart illustrating an exemplary embodiment of the present invention.

FIG. 1241*a* is a flowchart illustrating an exemplary embodiment of the present invention.

FIG. 1241*b* is a flowchart illustrating an exemplary embodiment of the present invention.

FIG. 1242 is a block diagram illustrating an exemplary embodiment of the present invention.

FIG. 1243 is a block diagram illustrating an exemplary embodiment of the present invention.

FIG. 1244 is a block diagram illustrating an exemplary embodiment of the present invention.

FIG. 1245 is a flowchart illustrating an exemplary embodiment of the present invention.

FIG. 1246 is a flowchart illustrating an exemplary embodiment of the present invention.

FIG. 1247 is a flowchart illustrating an exemplary embodiment of the present invention.

FIG. 1248 is a flowchart illustrating an exemplary embodiment of the present invention.

FIG. 1249 is a flowchart illustrating an exemplary embodiment of the present invention.

FIG. 1250 is a flowchart illustrating an exemplary embodiment of the present invention.

FIG. 1251 is a flowchart illustrating an exemplary embodiment of the present invention.

FIG. 1252 is a flowchart illustrating an exemplary embodiment of the present invention.

FIG. 1253*a* is a flowchart illustrating an exemplary embodiment of the present invention.

FIG. 1253*b* is a flowchart illustrating an exemplary embodiment of the present invention.

FIG. 1254 is a flowchart illustrating an exemplary embodiment of the present invention.

FIG. 1255 is a block diagram illustrating an exemplary embodiment of the present invention.

FIG. 1256 is a block diagram illustrating an exemplary embodiment of the present invention.

FIG. 1257 is a block diagram illustrating an exemplary embodiment of the present invention.

FIG. 1258 is a block diagram illustrating an exemplary embodiment of the present invention.

FIG. 1259 is a block diagram illustrating an exemplary embodiment of the present invention.

FIG. 1260 is a block diagram illustrating an exemplary embodiment of the present invention.

FIG. 1261 is a block diagram illustrating an exemplary embodiment of the present invention.

FIG. 1262 is a block diagram illustrating an exemplary embodiment of the present invention.

FIG. 1263 is a block diagram illustrating an exemplary embodiment of the present invention.

FIG. 1264 is a block diagram illustrating an exemplary embodiment of the present invention.

FIG. 1265 is a block diagram illustrating an exemplary embodiment of the present invention.

FIG. 1266 is a block diagram illustrating an exemplary embodiment of the present invention.

FIG. 1267 is a block diagram illustrating an exemplary embodiment of the present invention.

FIG. 1268 is a block diagram illustrating an exemplary embodiment of the present invention.

FIG. 1269 is a block diagram illustrating an exemplary embodiment of the present invention.

FIG. 1270 is a block diagram illustrating an exemplary embodiment of the present invention.

FIG. 1271 is a flowchart illustrating an exemplary embodiment of the present invention.

FIG. 1272 is a flowchart illustrating an exemplary embodiment of the present invention.

FIG. 1273 is a flowchart illustrating an exemplary embodiment of the present invention.

FIG. 1274 is a flowchart illustrating an exemplary embodiment of the present invention.

FIG. 1275 is a flowchart illustrating an exemplary embodiment of the present invention.

FIG. 1276 is a flowchart illustrating an exemplary embodiment of the present invention.

FIG. 1277 is a flowchart illustrating an exemplary embodiment of the present invention.

FIG. 1278 is a flowchart illustrating an exemplary embodiment of the present invention.

FIG. 1279 is a block diagram illustrating an exemplary embodiment of the present invention.

FIG. 1280 is a block diagram illustrating an exemplary embodiment of the present invention.

FIG. 1281 is a flowchart illustrating an exemplary embodiment of the present invention.

FIG. 1282 is a flowchart illustrating an exemplary embodiment of the present invention.

FIG. 1283 is a flowchart illustrating an exemplary embodiment of the present invention.

FIG. 1284 is a flowchart illustrating an exemplary embodiment of the present invention.

FIG. 1285 is a flowchart illustrating an exemplary embodiment of the present invention.

FIG. 1286 is a flowchart illustrating an exemplary embodiment of the present invention.

FIG. 1287 is a flowchart illustrating an exemplary embodiment of the present invention.

FIG. 1288 is a flowchart illustrating an exemplary embodiment of the present invention.

FIG. 1289 is a block diagram illustrating an exemplary embodiment of the present invention.

FIG. 1290 is a block diagram illustrating an exemplary embodiment of the present invention.

FIG. 1291 is a block diagram illustrating an exemplary embodiment of the present invention.

FIG. 1292 is a block diagram illustrating an exemplary embodiment of the present invention.

FIG. 1293 is a block diagram illustrating an exemplary embodiment of the present invention.

FIG. 1294 is a block diagram illustrating an exemplary embodiment of the present invention.

FIG. 1295 is a block diagram illustrating an exemplary embodiment of the present invention.

FIG. 1296 is a block diagram illustrating an exemplary embodiment of the present invention.

FIG. 1297 is a block diagram illustrating an exemplary embodiment of the present invention.

FIG. 1298 is a block diagram illustrating an exemplary embodiment of the present invention.

FIG. 1299 is a block diagram illustrating an exemplary embodiment of the present invention.

FIG. 1300 is a flowchart illustrating an exemplary embodiment of the present invention.

FIG. 1301 is a flowchart illustrating an exemplary embodiment of the present invention.

FIG. 1302 is a flowchart illustrating an exemplary embodiment of the present invention.

FIG. 1303 is a simplified illustration illustrating an exemplary embodiment of the present invention.

FIG. 1304 is a flowchart illustrating an exemplary embodiment of the present invention.

FIG. 1305 is a simplified illustration illustrating an exemplary embodiment of the present invention.

FIG. 1306 is a flowchart illustrating an exemplary embodiment of the present invention.

FIG. 1307 is a simplified illustration illustrating an exemplary embodiment of the present invention.

FIG. 1308 is a flowchart illustrating an exemplary embodiment of the present invention.

FIG. 1309 is a flowchart illustrating an exemplary embodiment of the present invention.

FIG. 1310 is a flowchart illustrating an exemplary embodiment of the present invention.

FIG. 1311 is a simplified illustration illustrating an exemplary embodiment of the present invention.

FIG. 1312 is a flowchart illustrating an exemplary embodiment of the present invention.

FIG. 1313 is a simplified illustration illustrating an exemplary embodiment of the present invention.

FIG. 1314 is a flowchart illustrating an exemplary embodiment of the present invention.

FIG. 1315 is a simplified illustration illustrating an exemplary embodiment of the present invention.

FIG. 1316 is a flowchart illustrating an exemplary embodiment of the present invention.

FIG. 1317 is a flowchart illustrating an exemplary embodiment of the present invention.

FIG. 1318 is a flowchart illustrating an exemplary embodiment of the present invention.

FIG. 1319 is a simplified illustration illustrating an exemplary embodiment of the present invention.

FIG. 1320 is a flowchart illustrating an exemplary embodiment of the present invention.

FIG. 1321 is a simplified illustration illustrating an exemplary embodiment of the present invention.

FIG. 1322 is a flowchart illustrating an exemplary embodiment of the present invention.

FIG. 1323 is a simplified illustration illustrating an exemplary embodiment of the present invention.

FIG. 1324 is a flowchart illustrating an exemplary embodiment of the present invention.

FIG. 1325 is a flowchart illustrating an exemplary embodiment of the present invention.

FIG. 1326 is a flowchart illustrating an exemplary embodiment of the present invention.

FIG. 1327 is a simplified illustration illustrating an exemplary embodiment of the present invention.

FIG. 1328 is a flowchart illustrating an exemplary embodiment of the present invention.

FIG. 1329 is a simplified illustration illustrating an exemplary embodiment of the present invention.

FIG. 1330 is a flowchart illustrating an exemplary embodiment of the present invention.

FIG. 1331 is a simplified illustration illustrating an exemplary embodiment of the present invention.

FIG. 1332 is a block diagram illustrating an exemplary embodiment of the present invention.

FIG. 1333 is a block diagram illustrating an exemplary embodiment of the present invention.

FIG. 1334 is a block diagram illustrating an exemplary embodiment of the present invention.

FIG. 1335 is a block diagram illustrating an exemplary embodiment of the present invention.

FIG. 1336 is a block diagram illustrating an exemplary embodiment of the present invention.

FIG. 1337 is a block diagram illustrating an exemplary embodiment of the present invention.

FIG. 1338 is a block diagram illustrating an exemplary embodiment of the present invention.

FIG. 1339 is a block diagram illustrating an exemplary embodiment of the present invention.

FIG. 1340 is a block diagram illustrating an exemplary embodiment of the present invention.

FIG. 1341 is a block diagram illustrating an exemplary embodiment of the present invention.

FIG. 1342 is a block diagram illustrating an exemplary embodiment of the present invention.

FIG. 1343 is a block diagram illustrating an exemplary embodiment of the present invention.

FIG. 1344 is a block diagram illustrating an exemplary embodiment of the present invention.

FIG. 1345 is a block diagram illustrating an exemplary embodiment of the present invention.

FIG. 1346 is a block diagram illustrating an exemplary embodiment of the present invention.

FIG. 1347 is a block diagram illustrating an exemplary embodiment of the present invention.

FIG. 1348 is a block diagram illustrating an exemplary embodiment of the present invention.

FIG. 1349 is a block diagram illustrating an exemplary embodiment of the present invention.

FIG. 1350 is a block diagram illustrating an exemplary embodiment of the present invention.

FIG. 1351 is a block diagram illustrating an exemplary embodiment of the present invention.

FIG. 1352 is a flowchart illustrating an exemplary embodiment of the present invention.

FIG. 1353 is a flowchart illustrating an exemplary embodiment of the present invention.

FIG. 1354 is a flowchart illustrating an exemplary embodiment of the present invention.

FIG. 1355 is a flowchart illustrating an exemplary embodiment of the present invention.

FIG. 1356 is a flowchart illustrating an exemplary embodiment of the present invention.

FIG. 1357 is a flowchart illustrating an exemplary embodiment of the present invention.

FIG. 1358 is a flowchart illustrating an exemplary embodiment of the present invention.

FIG. 1359 is a flowchart illustrating an exemplary embodiment of the present invention.

FIG. 1360 is a flowchart illustrating an exemplary embodiment of the present invention.

FIG. 1361 is a flowchart illustrating an exemplary embodiment of the present invention.

FIG. 1362 is a flowchart illustrating an exemplary embodiment of the present invention.

FIG. 1363 is a flowchart illustrating an exemplary embodiment of the present invention.

FIG. 1364 is a flowchart illustrating an exemplary embodiment of the present invention.

FIG. 1365 is a flowchart illustrating an exemplary embodiment of the present invention.

FIG. 1366 is a flowchart illustrating an exemplary embodiment of the present invention.

FIG. 1367 is a flowchart illustrating an exemplary embodiment of the present invention.

FIG. 1368 is a flowchart illustrating an exemplary embodiment of the present invention.

FIG. 1369 is a flowchart illustrating an exemplary embodiment of the present invention.

FIG. 1370 is a flowchart illustrating an exemplary embodiment of the present invention.

FIG. 1371 is a flowchart illustrating an exemplary embodiment of the present invention.

FIG. 1372 is a flowchart illustrating an exemplary embodiment of the present invention.

FIG. 1373 is a flowchart illustrating an exemplary embodiment of the present invention.

FIG. 1374 is a flowchart illustrating an exemplary embodiment of the present invention.

FIG. 1375 is a flowchart illustrating an exemplary embodiment of the present invention.

FIG. 1376 is a block diagram illustrating an exemplary embodiment of the present invention.

FIG. 1377 is a block diagram illustrating an exemplary embodiment of the present invention.

FIG. 1378 is a block diagram illustrating an exemplary embodiment of the present invention.

FIG. 1379 is a block diagram illustrating an exemplary embodiment of the present invention.

FIG. 1380 is a block diagram illustrating an exemplary embodiment of the present invention.

FIG. 1381 is a block diagram illustrating an exemplary embodiment of the present invention.

FIG. 1382 is a block diagram illustrating an exemplary embodiment of the present invention.

FIG. 1383 is a block diagram illustrating an exemplary embodiment of the present invention.

FIG. 1384 is a block diagram illustrating an exemplary embodiment of the present invention.

FIG. 1385 is a block diagram illustrating an exemplary embodiment of the present invention.

FIG. 1386 is a block diagram illustrating an exemplary embodiment of the present invention.

FIG. 1387 is a block diagram illustrating an exemplary embodiment of the present invention.

FIG. 1388 is a flowchart illustrating an exemplary embodiment of the present invention.

FIG. 1389 is a flowchart illustrating an exemplary embodiment of the present invention.

FIG. 1390 is a flowchart illustrating an exemplary embodiment of the present invention.

FIG. 1391 is a flowchart illustrating an exemplary embodiment of the present invention.

FIG. 1392 is a flowchart illustrating an exemplary embodiment of the present invention.

FIG. 1393 is a flowchart illustrating an exemplary embodiment of the present invention.

FIG. 1394 is a block diagram illustrating an exemplary embodiment of the present invention.

FIG. 1395 is a block diagram illustrating an exemplary embodiment of the present invention.

FIG. 1396 is a block diagram illustrating an exemplary embodiment of the present invention.

FIG. 1397 is a block diagram illustrating an exemplary embodiment of the present invention.

FIG. 1398 is a block diagram illustrating an exemplary embodiment of the present invention.

FIG. 1399 is a block diagram illustrating an exemplary embodiment of the present invention.

FIG. 1400 is a block diagram illustrating an exemplary embodiment of the present invention.

FIG. 1401 is a block diagram illustrating an exemplary embodiment of the present invention.

FIG. 1402 is a block diagram illustrating an exemplary embodiment of the present invention.

FIG. 1403 is a block diagram illustrating an exemplary embodiment of the present invention.

FIG. 1404 is a block diagram illustrating an exemplary embodiment of the present invention.

FIG. 1405 is a block diagram illustrating an exemplary embodiment of the present invention.

FIG. 1406 is a block diagram illustrating an exemplary embodiment of the present invention.

FIG. 1407 is a flowchart illustrating an exemplary embodiment of the present invention.

FIG. 1408 is a flowchart illustrating an exemplary embodiment of the present invention.

FIG. 1409 is a flowchart illustrating an exemplary embodiment of the present invention.

FIG. 1410 is a flowchart illustrating an exemplary embodiment of the present invention.

FIG. 1411 is a flowchart illustrating an exemplary embodiment of the present invention.

FIG. 1412 is a flowchart illustrating an exemplary embodiment of the present invention.

FIG. 1413 is a flowchart illustrating an exemplary embodiment of the present invention.

FIG. 1414 is a flowchart illustrating an exemplary embodiment of the present invention.

FIG. 1415 is a flowchart illustrating an exemplary embodiment of the present invention.

FIG. 1416 is a block diagram illustrating an exemplary embodiment of the present invention.

FIG. 1417 is a block diagram illustrating an exemplary embodiment of the present invention.

FIG. 1418 is a block diagram illustrating an exemplary embodiment of the present invention.

FIG. 1419 is a block diagram illustrating an exemplary embodiment of the present invention.

FIG. 1420 is a block diagram illustrating an exemplary embodiment of the present invention.

FIG. 1421 is a block diagram illustrating an exemplary embodiment of the present invention.

FIG. **1421*a*** is a simplified illustration illustrating an exemplary embodiment of the present invention.

FIG. 1422 is a block diagram illustrating an exemplary embodiment of the present invention.

FIG. 1423 is a block diagram illustrating an exemplary embodiment of the present invention.

FIG. 1424 is a block diagram illustrating an exemplary embodiment of the present invention.

FIG. 1425 is a block diagram illustrating an exemplary embodiment of the present invention.

FIG. 1426 is a block diagram illustrating an exemplary embodiment of the present invention.

FIG. 1427 is a block diagram illustrating an exemplary embodiment of the present invention.

FIG. 1428 is a block diagram illustrating an exemplary embodiment of the present invention.

FIG. 1429 is a flowchart illustrating an exemplary embodiment of the present invention.

FIG. 1430 is a flowchart illustrating an exemplary embodiment of the present invention.

FIG. 1431 is a flowchart illustrating an exemplary embodiment of the present invention.

FIG. 1432 is a flowchart illustrating an exemplary embodiment of the present invention.

FIG. 1433 is a flowchart illustrating an exemplary embodiment of the present invention.

FIG. 1434 is a flowchart illustrating an exemplary embodiment of the present invention.

FIG. 1435 is a flowchart illustrating an exemplary embodiment of the present invention.

FIG. 1436 is a flowchart illustrating an exemplary embodiment of the present invention.

FIG. 1437 is a flowchart illustrating an exemplary embodiment of the present invention.

FIG. 1438 is a simplified illustration illustrating an exemplary embodiment of the present invention.

FIG. 1439 is a block diagram illustrating an exemplary embodiment of the present invention.

FIG. 1440 is a block diagram illustrating an exemplary embodiment of the present invention.

FIG. 1441 is a block diagram illustrating an exemplary embodiment of the present invention.

FIG. 1442 is a block diagram illustrating an exemplary embodiment of the present invention.

FIG. 1443 is a block diagram illustrating an exemplary embodiment of the present invention.

FIG. 1444 is a block diagram illustrating an exemplary embodiment of the present invention.

FIG. 1445 is a block diagram illustrating an exemplary embodiment of the present invention.

FIG. 1446 is a block diagram illustrating an exemplary embodiment of the present invention.

FIG. 1447 is a flowchart illustrating an exemplary embodiment of the present invention.

FIG. 1448 is a flowchart illustrating an exemplary embodiment of the present invention.

FIG. 1449 is a flowchart illustrating an exemplary embodiment of the present invention.

FIG. 1450 is a block diagram illustrating an exemplary embodiment of the present invention.

FIG. 1451 is a block diagram illustrating an exemplary embodiment of the present invention.

FIG. 1452 is a block diagram illustrating an exemplary embodiment of the present invention.

FIG. 1453 is a block diagram illustrating an exemplary embodiment of the present invention.

FIG. 1454 is a block diagram illustrating an exemplary embodiment of the present invention.

FIG. 1455 is a flowchart illustrating an exemplary embodiment of the present invention.

FIG. 1456 is a simplified illustration illustrating an exemplary embodiment of the present invention.

FIG. 1457 is a block diagram illustrating an exemplary embodiment of the present invention.

FIG. 1458 is a block diagram illustrating an exemplary embodiment of the present invention.

FIG. 1459 is a block diagram illustrating an exemplary embodiment of the present invention.

FIG. 1460 is a block diagram illustrating an exemplary embodiment of the present invention.

FIG. 1461 is a block diagram illustrating an exemplary embodiment of the present invention.

FIG. 1462 is a block diagram illustrating an exemplary embodiment of the present invention.

FIG. 1463 is a block diagram illustrating an exemplary embodiment of the present invention.

FIG. 1464 is a flowchart illustrating an exemplary embodiment of the present invention.

FIG. 1465 is a block diagram illustrating an exemplary embodiment of the present invention.

FIG. 1466 is a block diagram illustrating an exemplary embodiment of the present invention.

FIG. 1467 is a block diagram illustrating an exemplary embodiment of the present invention.

FIG. 1468 is a block diagram illustrating an exemplary embodiment of the present invention.

FIG. 1469 is a block diagram illustrating an exemplary embodiment of the present invention.

FIG. 1470 is a flowchart illustrating an exemplary embodiment of the present invention.

FIG. 1471 is a block diagram illustrating an exemplary embodiment of the present invention.

FIG. 1472 is a block diagram illustrating an exemplary embodiment of the present invention.

FIG. 1473 is a block diagram illustrating an exemplary embodiment of the present invention.

FIG. 1474 is a block diagram illustrating an exemplary embodiment of the present invention.

FIG. 1475 is a block diagram illustrating an exemplary embodiment of the present invention.

FIG. 1476 is a block diagram illustrating an exemplary embodiment of the present invention.

FIG. 1477 is a block diagram illustrating an exemplary embodiment of the present invention.

FIG. 1478 is a block diagram illustrating an exemplary embodiment of the present invention.

FIG. 1479 is a block diagram illustrating an exemplary embodiment of the present invention.

FIG. 1480 is a block diagram illustrating an exemplary embodiment of the present invention.

FIG. 1481 is a block diagram illustrating an exemplary embodiment of the present invention.

FIG. 1481*a* is a block diagram illustrating an exemplary embodiment of the present invention.

FIG. 1482 is a block diagram illustrating an exemplary embodiment of the present invention.

FIG. 1483 is a block diagram illustrating an exemplary embodiment of the present invention.

FIG. 1484 is a block diagram illustrating an exemplary embodiment of the present invention.

FIG. 1485 is a block diagram illustrating an exemplary embodiment of the present invention.

FIG. 1486 is a block diagram illustrating an exemplary embodiment of the present invention.

FIG. 1487 is a block diagram illustrating an exemplary embodiment of the present invention.

FIG. 1488 is a flowchart illustrating an exemplary embodiment of the present invention.

FIG. 1489 is a flowchart illustrating an exemplary embodiment of the present invention.

FIG. 1490 is a flowchart illustrating an exemplary embodiment of the present invention.

FIG. 1491 is a flowchart illustrating an exemplary embodiment of the present invention.

FIG. 1492 is a flowchart illustrating an exemplary embodiment of the present invention.

FIG. 1493 is a flowchart illustrating an exemplary embodiment of the present invention.

FIG. 1494 is a flowchart illustrating an exemplary embodiment of the present invention.

FIG. 1495 is a flowchart illustrating an exemplary embodiment of the present invention.

FIG. 1496 is a flowchart illustrating an exemplary embodiment of the present invention.

FIG. 1497 is a flowchart illustrating an exemplary embodiment of the present invention.

FIG. 1498 is a flowchart illustrating an exemplary embodiment of the present invention.

FIG. 1499 is a block diagram illustrating an exemplary embodiment of the present invention.

FIG. 1500 is a block diagram illustrating an exemplary embodiment of the present invention.

FIG. 1501 is a block diagram illustrating an exemplary embodiment of the present invention.

FIG. 1502 is a block diagram illustrating an exemplary embodiment of the present invention.

FIG. 1503 is a block diagram illustrating an exemplary embodiment of the present invention.

FIG. 1504 is a block diagram illustrating an exemplary embodiment of the present invention.

FIG. 1505 is a block diagram illustrating an exemplary embodiment of the present invention.

FIG. 1506 is a flowchart illustrating an exemplary embodiment of the present invention.

FIG. 1507 is a flowchart illustrating an exemplary embodiment of the present invention.

FIG. 1508 is a flowchart illustrating an exemplary embodiment of the present invention.

FIG. 1509 is a flowchart illustrating an exemplary embodiment of the present invention.

FIG. 1510 is a block diagram illustrating an exemplary embodiment of the present invention.

FIG. 1511 is a block diagram illustrating an exemplary embodiment of the present invention.

FIG. 1512 is a block diagram illustrating an exemplary embodiment of the present invention.

FIG. 1513 is a block diagram illustrating an exemplary embodiment of the present invention.

FIG. 1514 is a block diagram illustrating an exemplary embodiment of the present invention.

FIG. 1515 is a block diagram illustrating an exemplary embodiment of the present invention.

FIG. 1516 is a block diagram illustrating an exemplary embodiment of the present invention.

FIG. 1517 is a block diagram illustrating an exemplary embodiment of the present invention.

FIG. 1518 is a block diagram illustrating an exemplary embodiment of the present invention.

FIG. 1519 is a block diagram illustrating an exemplary embodiment of the present invention.

FIG. 1520 is a block diagram illustrating an exemplary embodiment of the present invention.

FIG. 1521 is a block diagram illustrating an exemplary embodiment of the present invention.

FIG. 1522 is a block diagram illustrating an exemplary embodiment of the present invention.

FIG. 1523 is a block diagram illustrating an exemplary embodiment of the present invention.

FIG. 1524 is a block diagram illustrating an exemplary embodiment of the present invention.

FIG. 1525 is a block diagram illustrating an exemplary embodiment of the present invention.

FIG. 1526 is a block diagram illustrating an exemplary embodiment of the present invention.

FIG. 1527 is a block diagram illustrating an exemplary embodiment of the present invention.

FIG. 1528 is a flowchart illustrating an exemplary embodiment of the present invention.

FIG. 1529 is a flowchart illustrating an exemplary embodiment of the present invention.

FIG. 1530 is a flowchart illustrating an exemplary embodiment of the present invention.

FIG. 1531 is a flowchart illustrating an exemplary embodiment of the present invention.

FIG. 1532 is a flowchart illustrating an exemplary embodiment of the present invention.

FIG. 1533 is a flowchart illustrating an exemplary embodiment of the present invention.

FIG. 1534 is a flowchart illustrating an exemplary embodiment of the present invention.

FIG. 1535 is a flowchart illustrating an exemplary embodiment of the present invention.

FIG. 1536 is a flowchart illustrating an exemplary embodiment of the present invention.

FIG. 1537 is a flowchart illustrating an exemplary embodiment of the present invention.

FIG. 1538 is a flowchart illustrating an exemplary embodiment of the present invention.

FIG. 1539 is a flowchart illustrating an exemplary embodiment of the present invention.

FIG. 1540 is a flowchart illustrating an exemplary embodiment of the present invention.

FIG. 1541 is a flowchart illustrating an exemplary embodiment of the present invention.

FIG. 1542 is a flowchart illustrating an exemplary embodiment of the present invention.

FIG. 1543 is a flowchart illustrating an exemplary embodiment of the present invention.

FIG. 1544 is a flowchart illustrating an exemplary embodiment of the present invention.

FIG. 1545 is a flowchart illustrating an exemplary embodiment of the present invention.

FIG. 1546 is a flowchart illustrating an exemplary embodiment of the present invention.

FIG. 1547 is a flowchart illustrating an exemplary embodiment of the present invention.

FIG. 1548 is a flowchart illustrating an exemplary embodiment of the present invention.

FIG. 1549 is a flowchart illustrating an exemplary embodiment of the present invention.

FIG. 1550 is a flowchart illustrating an exemplary embodiment of the present invention.

FIG. 1551 is a flowchart illustrating an exemplary embodiment of the present invention.

FIG. 1552 is a flowchart illustrating an exemplary embodiment of the present invention.

FIG. 1553 is a flowchart illustrating an exemplary embodiment of the present invention.

FIG. 1554 is a flowchart illustrating an exemplary embodiment of the present invention.

FIG. 1555 is a flowchart illustrating an exemplary embodiment of the present invention.

FIG. 1556 is a flowchart illustrating an exemplary embodiment of the present invention.

FIG. 1557 is a flowchart illustrating an exemplary embodiment of the present invention.

FIG. 1558 is a flowchart illustrating an exemplary embodiment of the present invention.

FIG. 1559 is a flowchart illustrating an exemplary embodiment of the present invention.

FIG. 1560 is a flowchart illustrating an exemplary embodiment of the present invention.

FIG. 1561 is a flowchart illustrating an exemplary embodiment of the present invention.

FIG. 1562 is a flowchart illustrating an exemplary embodiment of the present invention.

FIG. 1563 is a flowchart illustrating an exemplary embodiment of the present invention.

FIG. 1564 is a flowchart illustrating an exemplary embodiment of the present invention.

FIG. 1565 is a flowchart illustrating an exemplary embodiment of the present invention.

FIG. 1566 is a flowchart illustrating an exemplary embodiment of the present invention.

FIG. 1567 is a flowchart illustrating an exemplary embodiment of the present invention.

FIG. 1568 is a flowchart illustrating an exemplary embodiment of the present invention.

FIG. 1569 is a flowchart illustrating an exemplary embodiment of the present invention.

FIG. 1570 is a flowchart illustrating an exemplary embodiment of the present invention.

FIG. 1571 is a flowchart illustrating an exemplary embodiment of the present invention.

FIG. 1572 is a flowchart illustrating an exemplary embodiment of the present invention.

FIG. 1573 is a flowchart illustrating an exemplary embodiment of the present invention.

FIG. 1574 is a flowchart illustrating an exemplary embodiment of the present invention.

FIG. 1575 is a flowchart illustrating an exemplary embodiment of the present invention.

FIG. 1576 is a block diagram illustrating an exemplary embodiment of the present invention.

FIG. 1577 is a block diagram illustrating an exemplary embodiment of the present invention.

FIG. 1578 is a block diagram illustrating an exemplary embodiment of the present invention.

FIG. 1579 is a block diagram illustrating an exemplary embodiment of the present invention.

FIG. 1580 is a block diagram illustrating an exemplary embodiment of the present invention.

FIG. 1581 is a block diagram illustrating an exemplary embodiment of the present invention.

FIG. 1582 is a block diagram illustrating an exemplary embodiment of the present invention.

FIG. 1583 is a simplified illustration illustrating an exemplary embodiment of the present invention.

FIG. 1584 is a simplified illustration illustrating an exemplary embodiment of the present invention.

FIG. 1585 is a flowchart illustrating an exemplary embodiment of the present invention.

FIG. 1586 is a flowchart illustrating an exemplary embodiment of the present invention.

FIG. 1587 is a flowchart illustrating an exemplary embodiment of the present invention.

FIG. 1588 is a block diagram illustrating an exemplary embodiment of the present invention.

FIG. 1589 is a block diagram illustrating an exemplary embodiment of the present invention.

FIG. 1590 is a block diagram illustrating an exemplary embodiment of the present invention.

FIG. 1591 is a block diagram illustrating an exemplary embodiment of the present invention.

FIG. 1592 is a block diagram illustrating an exemplary embodiment of the present invention.

FIG. 1593 is a block diagram illustrating an exemplary embodiment of the present invention.

FIG. 1594 is a block diagram illustrating an exemplary embodiment of the present invention.

FIG. 1595 is a block diagram illustrating an exemplary embodiment of the present invention.

FIG. 1596 is a block diagram illustrating an exemplary embodiment of the present invention.

FIG. 1597 is a block diagram illustrating an exemplary embodiment of the present invention.

FIG. 1598 is a block diagram illustrating an exemplary embodiment of the present invention.

FIG. 1599 is a block diagram illustrating an exemplary embodiment of the present invention.

FIG. 1600 is a block diagram illustrating an exemplary embodiment of the present invention.

FIG. 1601 is a block diagram illustrating an exemplary embodiment of the present invention.

FIG. 1602 is a block diagram illustrating an exemplary embodiment of the present invention.

FIG. 1603 is a block diagram illustrating an exemplary embodiment of the present invention.

FIG. 1604 is a block diagram illustrating an exemplary embodiment of the present invention.

FIG. 1605 is a block diagram illustrating an exemplary embodiment of the present invention.

FIG. 1606 is a block diagram illustrating an exemplary embodiment of the present invention.

FIG. 1607 is a block diagram illustrating an exemplary embodiment of the present invention.

FIG. 1608 is a block diagram illustrating an exemplary embodiment of the present invention.

FIG. 1609 is a block diagram illustrating an exemplary embodiment of the present invention.

FIG. 1610 is a block diagram illustrating an exemplary embodiment of the present invention.

FIG. 1611 is a block diagram illustrating an exemplary embodiment of the present invention.

FIG. 1612 is a flowchart illustrating an exemplary embodiment of the present invention.

FIG. 1613 is a flowchart illustrating an exemplary embodiment of the present invention.

FIG. 1614 is a flowchart illustrating an exemplary embodiment of the present invention.

FIG. 1615 is a flowchart illustrating an exemplary embodiment of the present invention.

FIG. 1616 is a flowchart illustrating an exemplary embodiment of the present invention.

FIG. 1617 is a flowchart illustrating an exemplary embodiment of the present invention.

FIG. 1618 is a flowchart illustrating an exemplary embodiment of the present invention.

FIG. 1619 is a flowchart illustrating an exemplary embodiment of the present invention.

FIG. 1620 is a flowchart illustrating an exemplary embodiment of the present invention.

FIG. 1621 is a flowchart illustrating an exemplary embodiment of the present invention.

FIG. 1622 is a flowchart illustrating an exemplary embodiment of the present invention.

FIG. 1623 is a flowchart illustrating an exemplary embodiment of the present invention.

FIG. 1624 is a flowchart illustrating an exemplary embodiment of the present invention.

FIG. 1625 is a flowchart illustrating an exemplary embodiment of the present invention.

FIG. 1626 is a flowchart illustrating an exemplary embodiment of the present invention.

FIG. 1627 is a flowchart illustrating an exemplary embodiment of the present invention.

FIG. 1628 is a block diagram illustrating an exemplary embodiment of the present invention.

FIG. 1629 is a block diagram illustrating an exemplary embodiment of the present invention.

FIG. 1630 is a block diagram illustrating an exemplary embodiment of the present invention.

FIG. 1631 is a block diagram illustrating an exemplary embodiment of the present invention.

FIG. 1632 is a block diagram illustrating an exemplary embodiment of the present invention.

FIG. 1633 is a block diagram illustrating an exemplary embodiment of the present invention.

FIG. 1634 is a block diagram illustrating an exemplary embodiment of the present invention.

FIG. 1635 is a block diagram illustrating an exemplary embodiment of the present invention.

FIG. **1636*a*** is a block diagram illustrating an exemplary embodiment of the present invention.

FIG. **1636*b*** is a block diagram illustrating an exemplary embodiment of the present invention.

FIG. 1637 is a flowchart illustrating an exemplary embodiment of the present invention.

FIG. 1638 is a flowchart illustrating an exemplary embodiment of the present invention.

FIG. 1639 is a flowchart illustrating an exemplary embodiment of the present invention.

FIG. 1640 is a flowchart illustrating an exemplary embodiment of the present invention.

FIG. 1641 is a flowchart illustrating an exemplary embodiment of the present invention.

FIG. 1642 is a flowchart illustrating an exemplary embodiment of the present invention.

FIG. 1643 is a flowchart illustrating an exemplary embodiment of the present invention.

FIG. 1644 is a flowchart illustrating an exemplary embodiment of the present invention.

FIG. 1645 is a flowchart illustrating an exemplary embodiment of the present invention.

FIG. 1646 is a flowchart illustrating an exemplary embodiment of the present invention.

FIG. 1647 is a flowchart illustrating an exemplary embodiment of the present invention.

FIG. 1648 is a flowchart illustrating an exemplary embodiment of the present invention.

FIG. 1649 is a flowchart illustrating an exemplary embodiment of the present invention.

FIG. 1650 is a flowchart illustrating an exemplary embodiment of the present invention.

FIG. 1651 is a flowchart illustrating an exemplary embodiment of the present invention.

FIG. 1652 is a flowchart illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrates only one function or mode in order to avoid complexity in its explanation, however, such description does not mean that only one function or mode can be implemented at a time. In other words, more than one function or mode can be implemented simultaneously by way of utilizing the same random access memory. In addition, the figure numbers are cited after the elements in parenthesis in a manner for example 'RAM 206 (FIG. 1)'. It is done so merely to assist the readers to have a better understanding of this specification, and must not be used to limit the scope of the claims in any manner since the figure numbers cited are not exclusive. The scope of the invention should be determined by referencing the appended claims.

Figure 1:
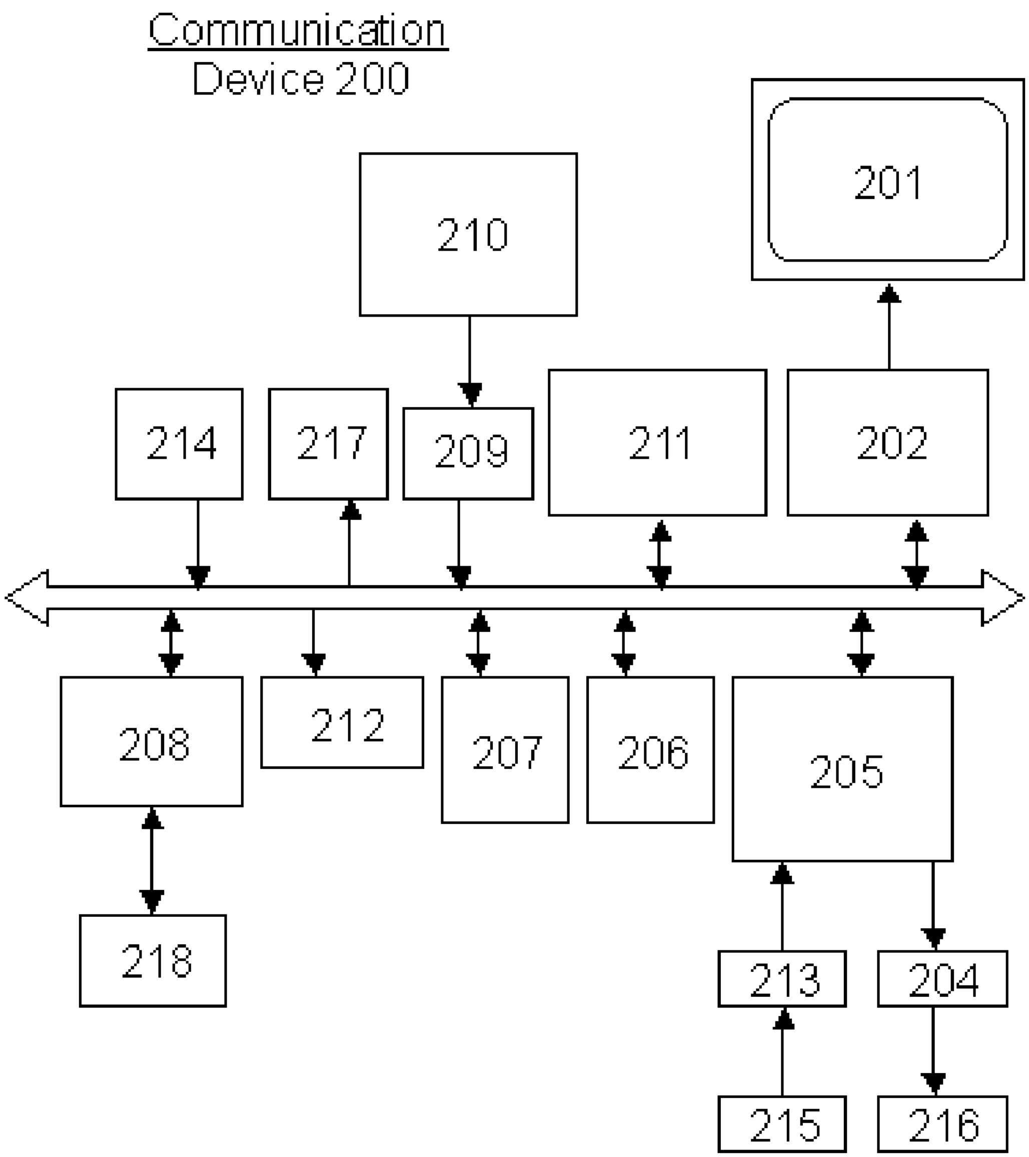
FIG. 1 is a block diagram illustrating an exemplary embodiment of the present invention.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable as described in the following patents: U.S. Pat. No. 6,496,161; U.S. Pat. No. 6,487,021; U.S. Pat. No. 6,462,882; U.S. Pat. No. 6,452,572; U.S. Pat. No. 6,448,944; U.S. Pat. No. 6,445,364; U.S. Pat. No. 6,445,363; U.S. Pat. No. 6,424,321; U.S. Pat. No. 6,421,183; U.S. Pat. No. 6,417,820; U.S. Pat. No. 6,388,814; U.S. Pat. No. 6,388,640; U.S. Pat. No. 6,369,952; U.S. Pat. No. 6,359,603; U.S. Pat. No. 6,359,602; U.S. Pat. No. 6,356,392; U.S. Pat. No. 6,353,503; U.S. Pat. No. 6,349,001; U.S. Pat. No. 6,329,965; U.S. Pat. No. 6,304,303; U.S. Pat. No. 6,271,808; U.S. Pat. No. 6,246,383; U.S. Pat. No. 6,239,771; U.S. Pat. No. 6,232,934; U.S. Pat. No. 6,222,675; U.S. Pat. No. 6,219,186; U.S. Pat. No. 6,204,974; U.S. Pat. No. 6,181,304; U.S. Pat. No. 6,160,666; U.S. Pat. No. 6,157,291; U.S. Pat. No. 6,147,807; U.S. Pat. No. 6,147,805; U.S. Pat. No. 6,140,980; U.S. Pat. No. 6,127,990; U.S. Pat. No. 6,124,837; U.S. Pat. No. 6,115,007; U.S. Pat. No. 6,097,543; U.S. Pat. No. 6,094,309; U.S. Pat. No. 6,094,242; U.S. Pat. No. 6,091,546; U.S. Pat. No. 6,084,556; U.S. Pat. No. 6,072,445; U.S. Pat. No. 6,055,110; U.S. Pat. No. 6,055,109; U.S. Pat. No. 6,050,717; U.S. Pat. No. 6,040,945; U.S. Pat. No. 6,034,653; U.S. Pat. No. 6,023,372; U.S. Pat. No. 6,011,653; U.S. Pat. No. 5,995, 071; U.S. Pat. No. 5,991,085; U.S. Pat. No. 5,982,343; U.S. Pat. No. 5,971,538; U.S. Pat. No. 5,966,242; U.S. Pat. No. 5,959,780; U.S. Pat. No. 5,954,642; U.S. Pat. No. 5,949,583; U.S. Pat. No. 5,943,171; U.S. Pat. No. 5,923,476; U.S. Pat. No. 5,903,396; U.S. Pat. No. 5,903,395; U.S. Pat. No. 5,900,849; U.S. Pat. No. 5,880,773; U.S. Pat. No. 5,864,326; U.S. Pat. No. 5,844,656; U.S. Pat. No. 5,844,530; U.S. Pat. No. 5,838,490; U.S. Pat. No. 5,835,279; U.S. Pat. No. 5,822,127; U.S. Pat. No. 5,808,802; U.S. Pat. No. 5,808,801; U.S. Pat. No. 5,774,096; U.S. Pat. No. 5,767,820; U.S. Pat. No. 5,757,339; U.S. Pat. No. 5,751,493; U.S. Pat. No. 5,742,264; U.S. Pat. No. 5,739,955; U.S. Pat. No. 5,739,797; U.S. Pat. No. 5,708,449; U.S. Pat. No. 5,673,059; U.S. Pat. No. 5,670,970; U.S. Pat. No. 5,642,221; U.S. Pat. No. 5,619,377; U.S. Pat. No. 5,619,373; U.S. Pat. No. 5,606,458; U.S. Pat. No. 5,572,229; U.S. Pat. No. 5,546,099; U.S. Pat. No. 5,543,816; U.S. Pat. No. 5,539,422; U.S. Pat. No. 5,537,253; U.S. Pat. No. 5,526,184; U.S. Pat. No. 5,486,841; U.S. Pat. No. 5,483,307; U.S. Pat. No. 5,341,242; U.S. Pat. No. 5,281,957; and U.S. Pat. No. 5,003,300.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant.

Figure 2A:
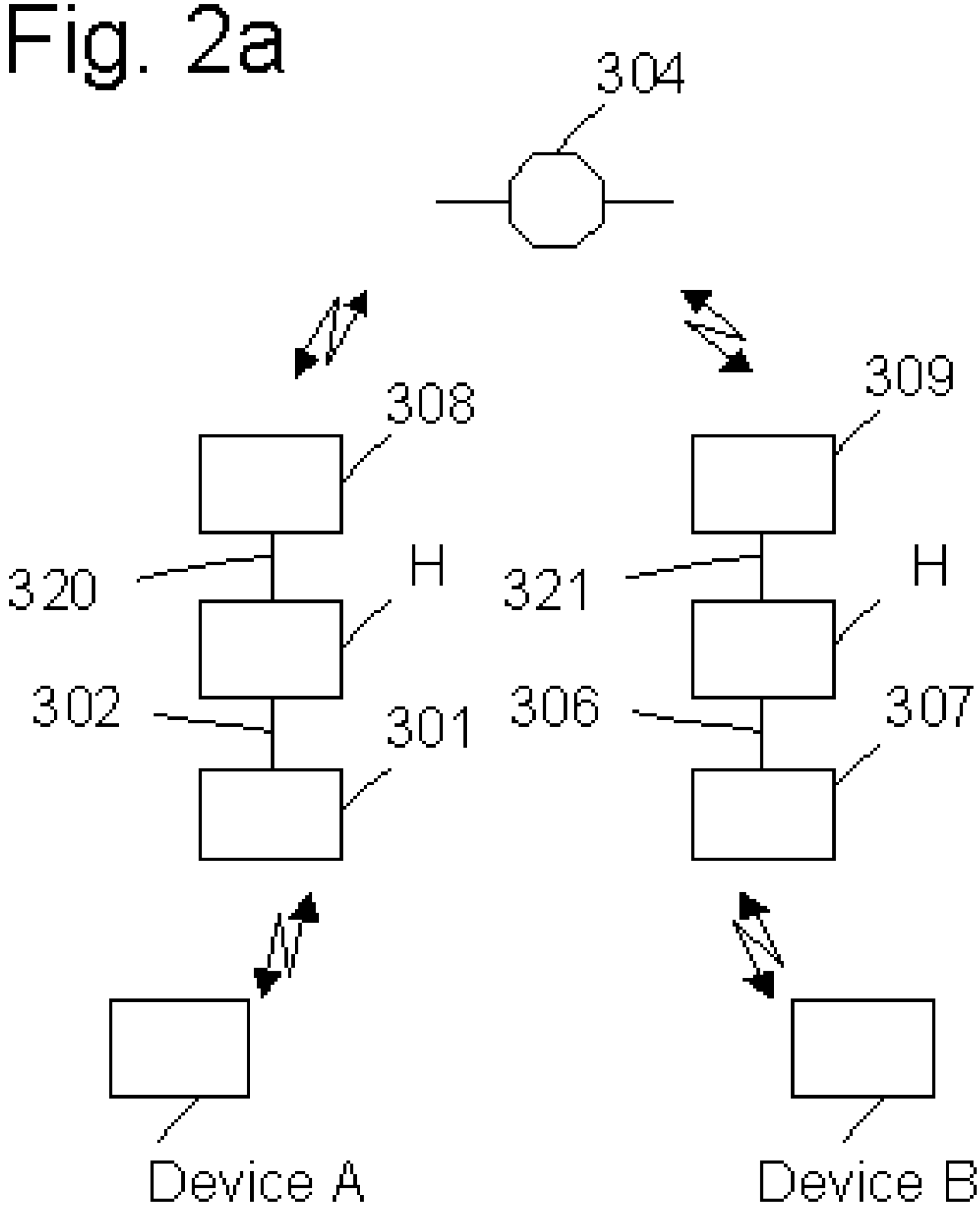
FIG. 2*a* is a simplified illustration illustrating an exemplary embodiment of the present invention.

FIG. 2*a* illustrates one of the preferred methods of the communication between two Communication Device 200. In FIG. 2*a*, both Device A and Device B represents Communication Device 200 in FIG. 1. Device A transfers wireless data to Transmitter 301 which Relays the data to Host H via Cable 302. The data is transferred to Transmitter 308 (e.g., a satellite dish) via Cable 320 and then to Artificial Satellite 304. Artificial Satellite 304 transfers the data to Transmitter 309 which transfers the data to Host H via Cable 321. The data is then transferred to Transmitter 307 via Cable 306 and to Device B in a wireless fashion. Device B transfers wireless data to Device A in the same manner.

Figure 2B:
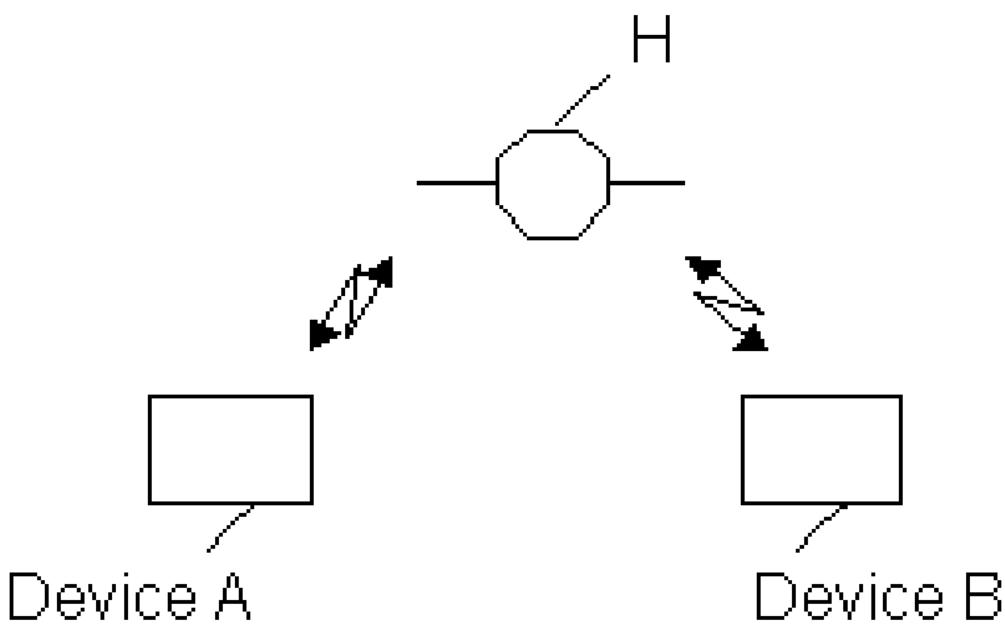
FIG. 2*b* is a simplified illustration illustrating an exemplary embodiment of the present invention.

FIG. 2*b* illustrates another preferred method of the communication between two Communication Devices 200. In this example, Device A directly transfers the wireless data to Host H, an artificial satellite, which transfers the data directly to Device B. Device B transfers wireless data to Device A in the same manner.

Figure 2C:
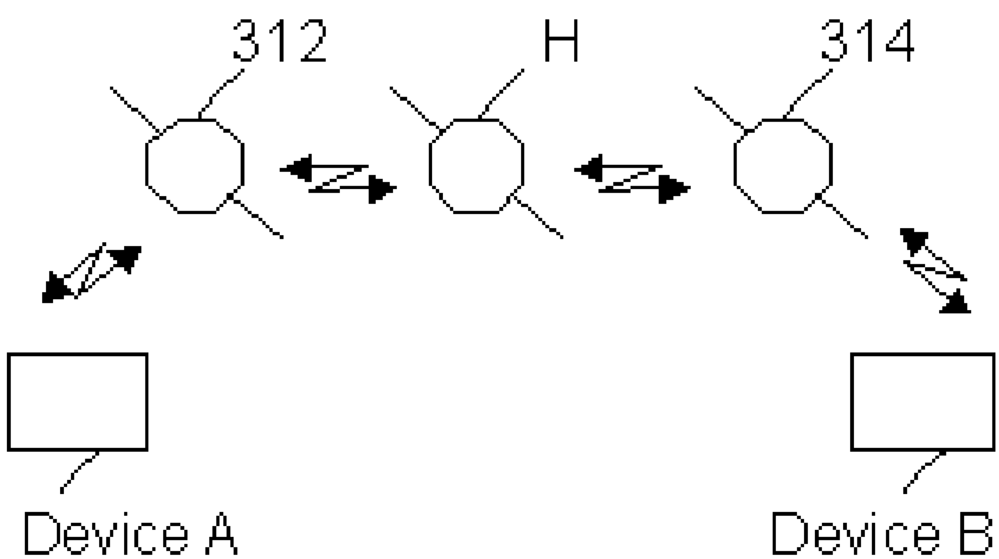
FIG. 2*c* is a simplified illustration illustrating an exemplary embodiment of the present invention.

FIG. 2*c* illustrates another preferred method of the communication between two Communication Devices 200. In this example, Device A transfers wireless data to Transmitter 312, an artificial satellite, which Relays the data to Host H, which is also an artificial satellite, in a wireless fashion. The data is transferred to Transmitter 314, an artificial satellite, which Relays the data to Device B in a wireless fashion. Device B transfers wireless data to Device A in the same manner.

<<Voice Recognition System>>

Communication Device 200 (FIG. 1) has a function to operate the device by the user's voice or convert the user's voice into a text format (i.e., the voice recognition). Such function can be enabled by the technologies primarily introduced in the following inventions and the references cited thereof: U.S. Pat. No. 6,282,268; U.S. Pat. No. 6,278,772; U.S. Pat. No. 6,269,335; U.S. Pat. No. 6,269,334; U.S. Pat. No. 6,260,015; U.S. Pat. No. 6,260,014; U.S. Pat. No. 6,253,177; U.S. Pat. No. 6,253,175; U.S. Pat. No. 6,249,763; U.S. Pat. No. 6,246,990; U.S. Pat. No. 6,233,560; U.S. Pat. No. 6,219,640; U.S. Pat. No. 6,219,407; U.S. Pat. No. 6,199,043; U.S. Pat. No. 6,199,041; U.S. Pat. No. 6,195,641; U.S. Pat. No. 6,192,343; U.S. Pat. No. 6,192,337; U.S. Pat. No. 6,188,976; U.S. Pat. No. 6,185,530; U.S. Pat. No. 6,185,529; U.S. Pat. No. 6,185,527; U.S. Pat. No. 6,182,037; U.S. Pat. No. 6,178,401; U.S. Pat. No. 6,175,820; U.S. Pat. No. 6,163,767; U.S. Pat. No. 6,157,910; U.S. Pat. No. 6,119,086; U.S. Pat. No. 6,119,085; U.S. Pat. No. 6,101,472; U.S. Pat. No. 6,100,882; U.S. Pat. No. 6,092,039; U.S. Pat. No. 6,088,669; U.S. Pat. No. 6,078,807; U.S. Pat. No. 6,075,534; U.S. Pat. No. 6,073,101; U.S. Pat. No. 6,073,096; U.S. Pat. No. 6,073,091; U.S. Pat. No. 6,067,517; U.S. Pat. No. 6,067,514; U.S. Pat. No. 6,061,646; U.S. Pat. No. 6,044,344; U.S. Pat. No. 6,041,300; U.S. Pat. No. 6,035,271; U.S. Pat. No. 6,006,183; U.S. Pat. No. 5,995,934; U.S. Pat. No. 5,974,383; U.S. Pat. No. 5,970,239; U.S. Pat. No. 5,963,905; U.S. Pat. No. 5,956,671; U.S. Pat. No. 5,953,701; U.S. Pat. No. 5,953,700; U.S. Pat. No. 5,937,385; U.S. Pat. No. 5,937,383; U.S. Pat. No. 5,933,475; U.S. Pat. No. 5,930,749; U.S. Pat. No. 5,909,667; U.S. Pat. No. 5,899,973; U.S. Pat. No. 5,895,447; U.S. Pat. No. 5,884,263; U.S. Pat. No. 5,878,117; U.S. Pat. No. 5,864,819; U.S. Pat. No. 5,848,163; U.S. Pat. No. 5,819,225; U.S. Pat. No. 5,805,832; U.S. Pat. No. 5,802,251; U.S. Pat. No. 5,799,278; U.S. Pat. No. 5,797,122; U.S. Pat. No. 5,787,394; U.S. Pat. No. 5,768,603; U.S. Pat. No. 5,751,905; U.S. Pat. No. 5,729,656; U.S. Pat. No. 5,704,009; U.S. Pat. No. 5,671,328; U.S. Pat. No. 5,649,060; U.S. Pat. No. 5,615,299; U.S. Pat. No. 5,615,296; U.S. Pat. No. 5,544,277; U.S. Pat. No. 5,524,169; U.S. Pat. No. 5,522,011; U.S. Pat. No. 5,513,298; U.S. Pat. No. 5,502,791; U.S. Pat. No. 5,497,447; U.S. Pat. No. 5,477,451; U.S. Pat. No. 5,475,792; U.S. Pat. No. 5,465,317; U.S. Pat. No. 5,455,889; U.S. Pat. No. 5,440,663; U.S. Pat. No. 5,425,129; U.S. Pat. No. 5,353,377; U.S. Pat. No. 5,333,236; U.S. Pat. No. 5,313,531; U.S. Pat. No. 5,293,584; U.S. Pat. No. 5,293,451; U.S. Pat. No. 5,280,562; U.S. Pat. No. 5,278,942; U.S. Pat. No. 5,276,766; U.S. Pat. No. 5,267,345; U.S. Pat. No. 5,233,681; U.S. Pat. No. 5,222,146; U.S. Pat. No. 5,195,167; U.S. Pat. No. 5,182,773; U.S. Pat. No. 5,165,007; U.S. Pat. No. 5,129,001; U.S. Pat. No. 5,072,452; U.S. Pat. No. 5,067,166; U.S. Pat. No. 5,054,074; U.S. Pat. No. 5,050,215; U.S. Pat. No. 5,046,099; U.S. Pat. No. 5,033,087; U.S. Pat. No. 5,031,217; U.S. Pat. No. 5,018,201; U.S. Pat. No. 4,980,918; U.S. Pat. No. 4,977,599; U.S. Pat. No. 4,926,488; U.S. Pat. No. 4,914,704; U.S. Pat. No. 4,882,759; U.S. Pat. No. 4,876,720; U.S. Pat. No. 4,852,173; U.S. Pat. No. 4,833,712; U.S. Pat. No. 4,829,577; U.S. Pat. No. 4,827,521; U.S. Pat. No. 4,759,068; U.S. Pat. No. 4,748,670; U.S. Pat. No. 4,741,036; U.S. Pat. No. 4,718,094; U.S. Pat. No. 4,618,984; U.S. Pat. No. 4,348,553; U.S. Pat. No. 6,289,140; U.S. Pat. No. 6,275,803; U.S. Pat. No. 6,275,801; U.S. Pat. No. 6,272,146; U.S. Pat. No. 6,266,637; U.S. Pat. No. 6,266,571; U.S. Pat. No. 6,223,153; U.S. Pat. No. 6,219,638; U.S. Pat. No. 6,163,535; U.S. Pat. No. 6,115,820; U.S. Pat. No. 6,107, 935; U.S. Pat. No. 6,092,034; U.S. Pat. No. 6,088,361; U.S. Pat. No. 6,073,103; U.S. Pat. No. 6,073,095; U.S. Pat. No. 6,067,084; U.S. Pat. No. 6,064,961; U.S. Pat. No. 6,055,306; U.S. Pat. No. 6,047,301; U.S. Pat. No. 6,023,678; U.S. Pat. No. 6,023,673; U.S. Pat. No. 6,009,392; U.S. Pat. No. 5,995, 933; U.S. Pat. No. 5,995,931; U.S. Pat. No. 5,995,590; U.S. Pat. No. 5,991,723; U.S. Pat. No. 5,987,405; U.S. Pat. No. 5,974,382; U.S. Pat. No. 5,943,649; U.S. Pat. No. 5,916,302; U.S. Pat. No. 5,897,616; U.S. Pat. No. 5,897,614; U.S. Pat. No. 5,893,133; U.S. Pat. No. 5,873,064; U.S. Pat. No. 5,870, 616; U.S. Pat. No. 5,864,805; U.S. Pat. No. 5,857,099; U.S. Pat. No. 5,809,471; U.S. Pat. No. 5,805,907; U.S. Pat. No. 5,799,273; U.S. Pat. No. 5,764,852; U.S. Pat. No. 5,715,469; U.S. Pat. No. 5,682,501; U.S. Pat. No. 5,680,509; U.S. Pat. No. 5,668,854; U.S. Pat. No. 5,664,097; U.S. Pat. No. 5,649, 070; U.S. Pat. No. 5,640,487; U.S. Pat. No. 5,621,809; U.S. Pat. No. 5,577,249; U.S. Pat. No. 5,502,774; U.S. Pat. No. 5,471,521; U.S. Pat. No. 5,467,425; U.S. Pat. No. 5,444,617; U.S. Pat. No. 4,991,217; U.S. Pat. No. 4,817,158; U.S. Pat. No. 4,725,885; U.S. Pat. No. 4,528,659; U.S. Pat. No. 3,995, 254; U.S. Pat. No. 3,969,700; U.S. Pat. No. 3,925,761; U.S. Pat. No. 3,770,892. The voice recognition function can be performed in terms of software by using Area 261, the voice recognition working area, of RAM 206 (FIG. 1) which is specifically allocated to perform such function as described in FIG. 3, or can also be performed in terms of hardware circuit where such space is specifically allocated in Area 282 of Sound Processor 205 (FIG. 1) for the voice recognition system as described in FIG. 4.

Figure 3:
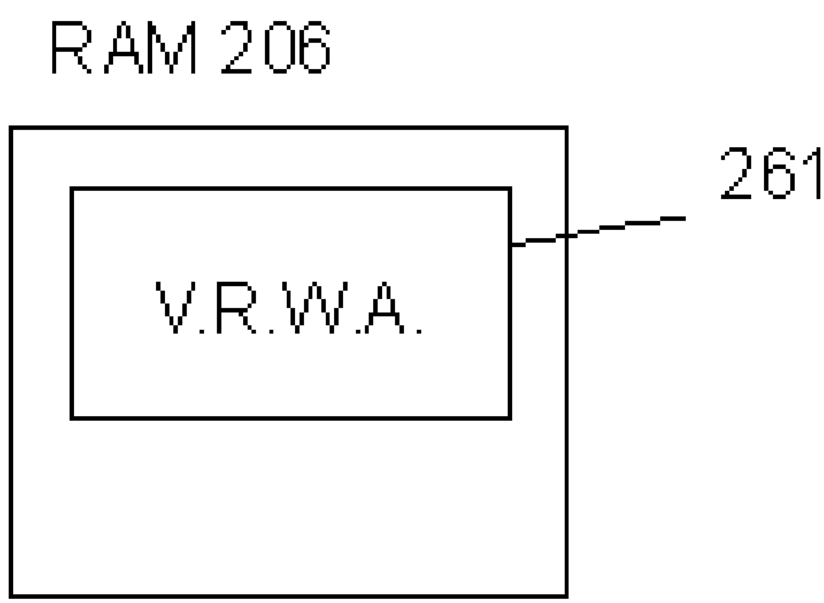
FIG. 3 is a block diagram illustrating an exemplary embodiment of the present invention.
Figure 4:
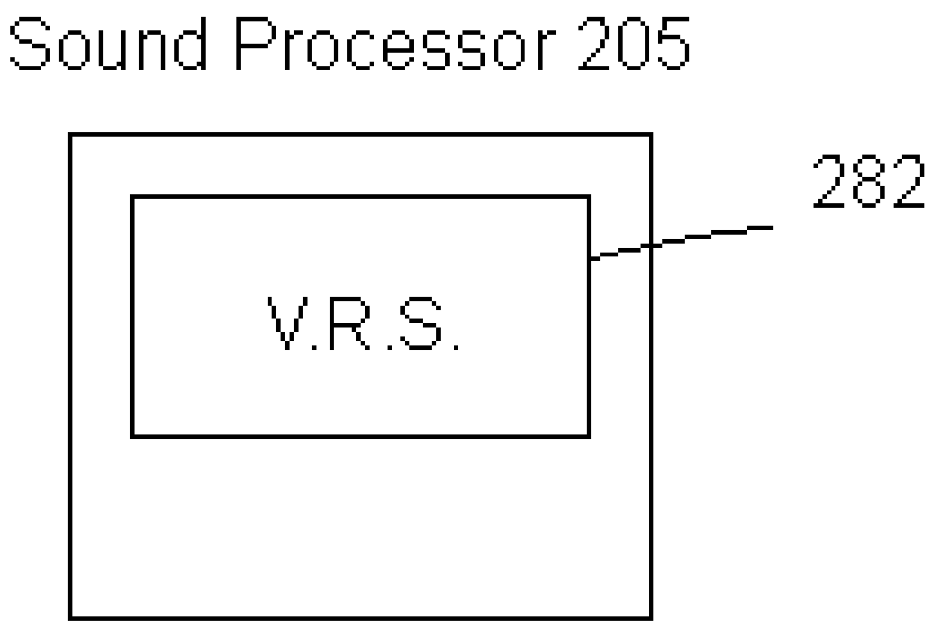
FIG. 4 is a block diagram illustrating an exemplary embodiment of the present invention.
Figure 5:
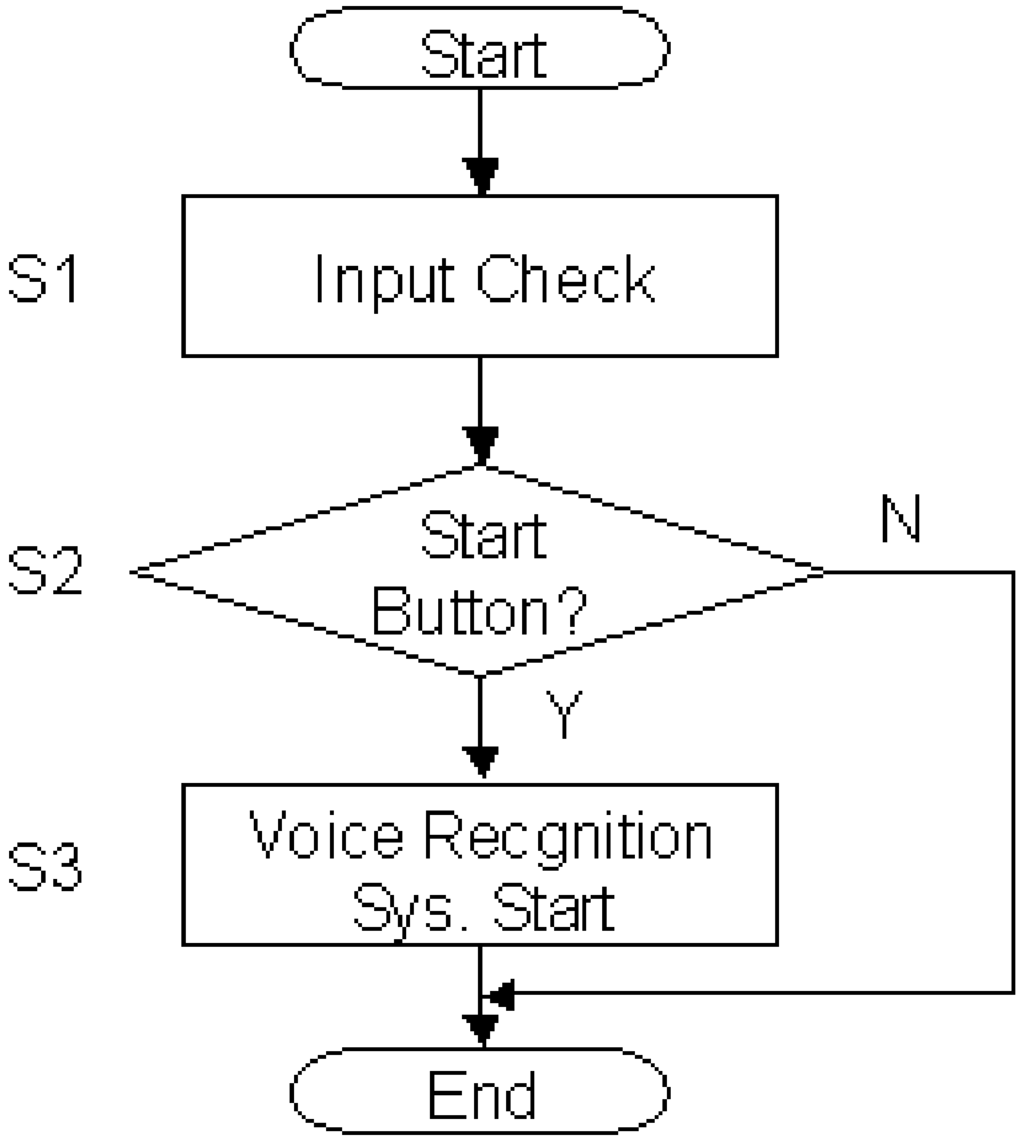
FIG. 5 is a flowchart illustrating an exemplary embodiment of the present invention.

FIG. 5 illustrates how the voice recognition function is activated. CPU 211 (FIG. 1) periodically checks the input status of Input Device 210 (FIG. 1) (S1). If the CPU 211 detects a specific signal input from Input Device 210 (S2) the voice recognition system which is described in FIG. 2 and/or FIG. 3 is activated. As another embodiment, the voice recognition system can also be activated by entering predetermined phrase, such as 'start voice recognition system' via Microphone 215 (FIG. 1).

<<Voice Recognition—Dialing/Auto-Off During Call Function>>

Figure 6A:
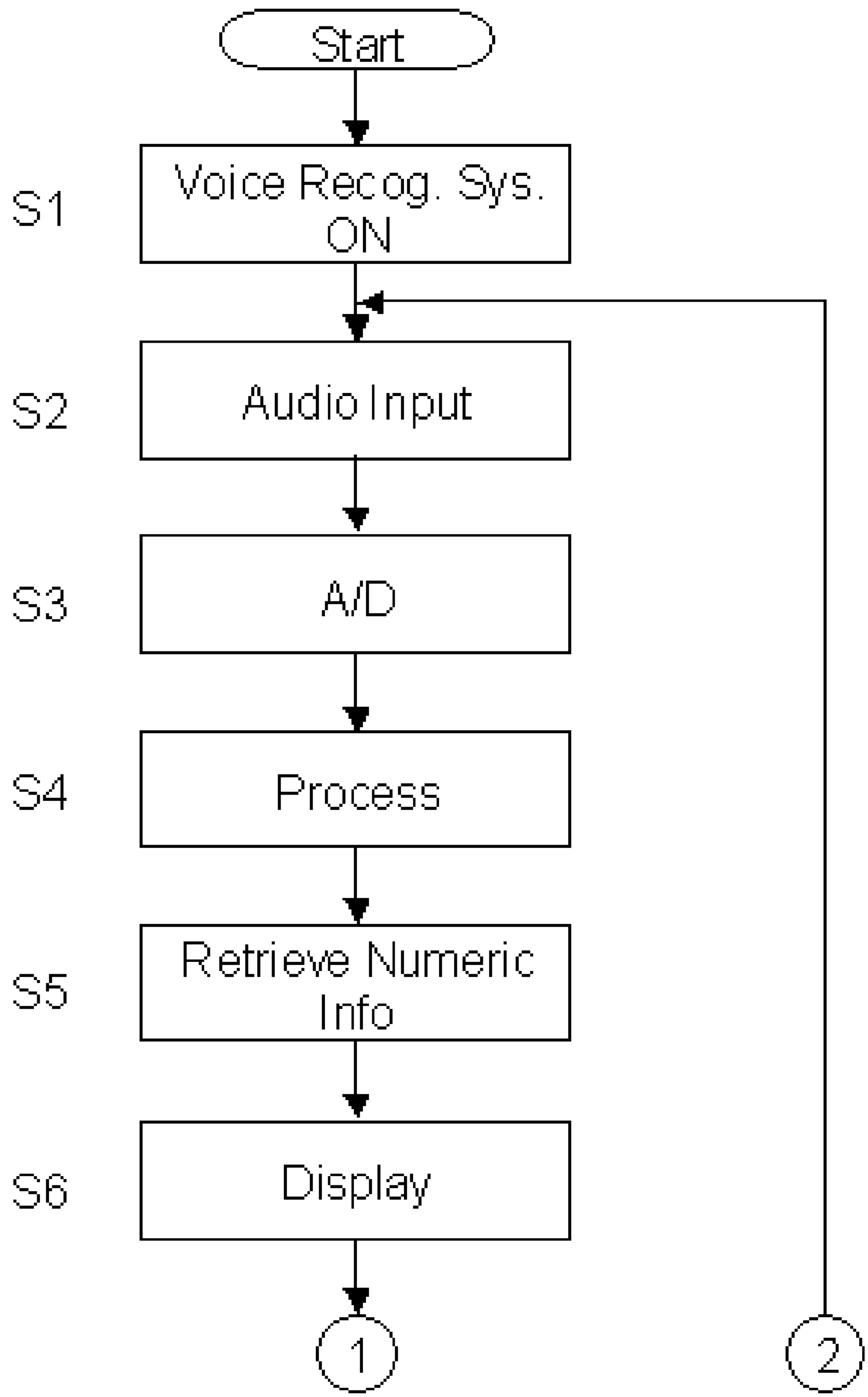
FIG. 6*a* is a flowchart illustrating an exemplary embodiment of the present invention.
Figure 6B:
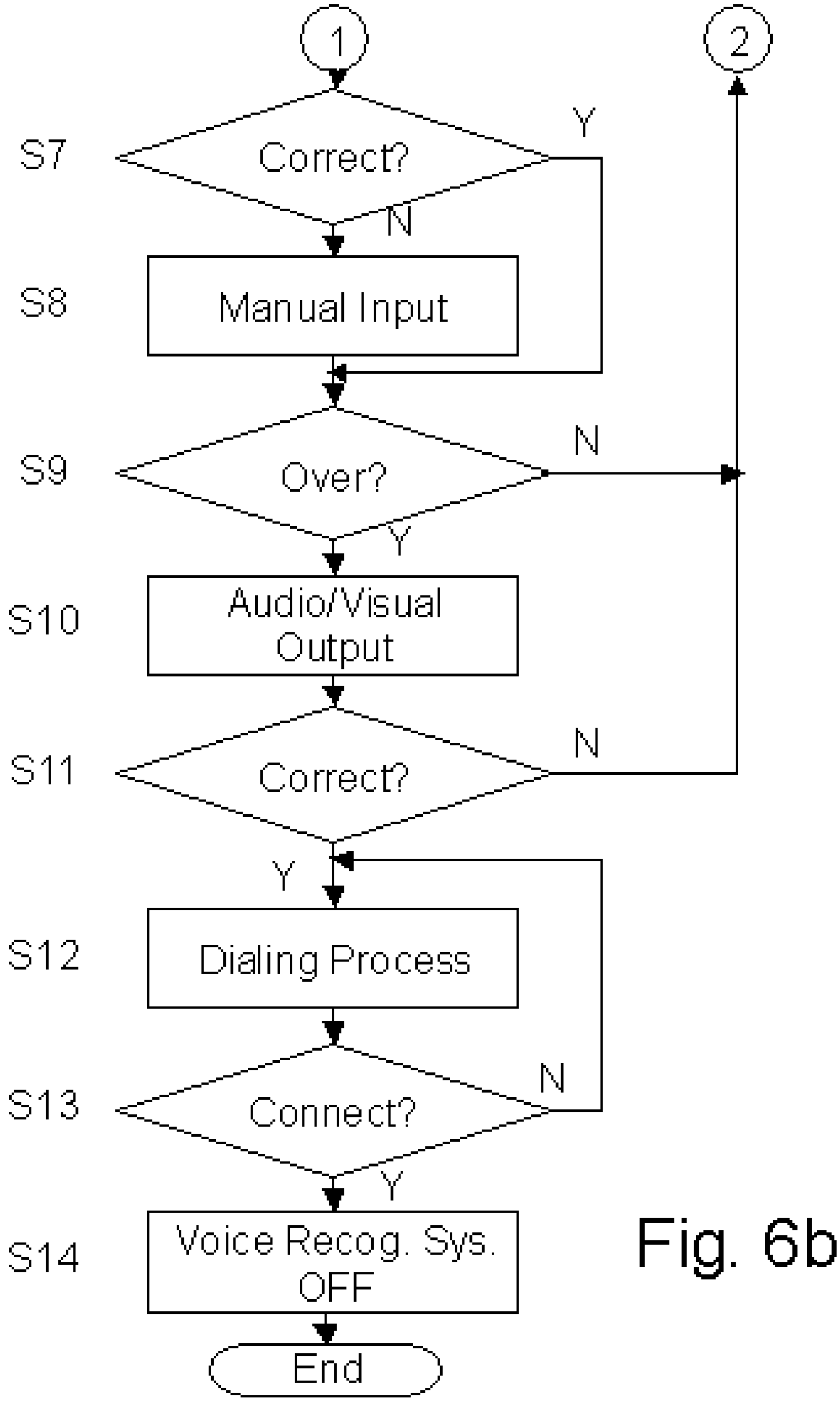
FIG. 6*b* is a flowchart illustrating an exemplary embodiment of the present invention.

FIG. 6*a* and FIG. 6*b* illustrate the operation of the voice recognition in the present invention. Once the voice recognition system is activated (S1) the analog audio data is input from Microphone 215 (FIG. 1) (S2). The analog audio data is converted into digital data by A/D 213 (FIG. 1) (S3). The digital audio data is processed by Sound Processor 205 (FIG. 1) to retrieve the text and numeric information therefrom (S4). Then the numeric information is retrieved (S5) and displayed on LCD 201 (FIG. 1) (S6). If the retrieved numeric information is not correct (S7), the user can input the correct numeric information manually by using Input Device 210 (FIG. 1) (S8). Once the sequence of inputting the numeric information is completed and after the confirmation process is over (S9), the entire numeric information is displayed on LCD 201 and the sound is output from Speaker 216 under control of CPU 211 (S10). If the numeric information is correct (S11), Communication Device 200 (FIG. 1) initiates the dialing process by utilizing the numeric information (S12). The dialing process continues until Communication Device 200 is connected to another device (S13). Once CPU 211 detects that the line is connected it automatically deactivates the voice recognition system (S14).

Figure 7:
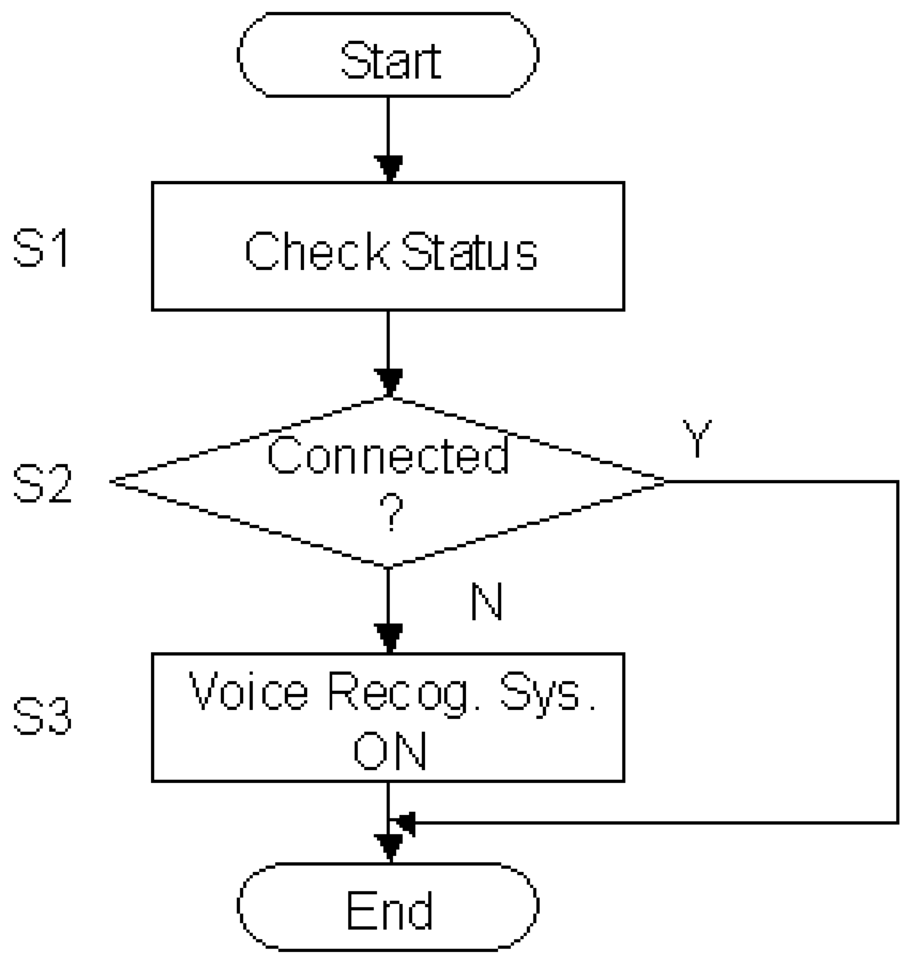
FIG. 7 is a flowchart illustrating an exemplary embodiment of the present invention.

As described in FIG. 7, CPU 211 (FIG. 1) checks the status of Communication Device 200 periodically (S1) and remains the voice recognition system offline during call (S2). If the connection is severed, i.e., user hangs up, then CPU 211 reactivates the voice recognition system (S3).

<<Voice Recognition Tag Function>>

FIGS. 8 through 12 describes the method of inputting the numeric information in a convenient manner.

Figure 11:
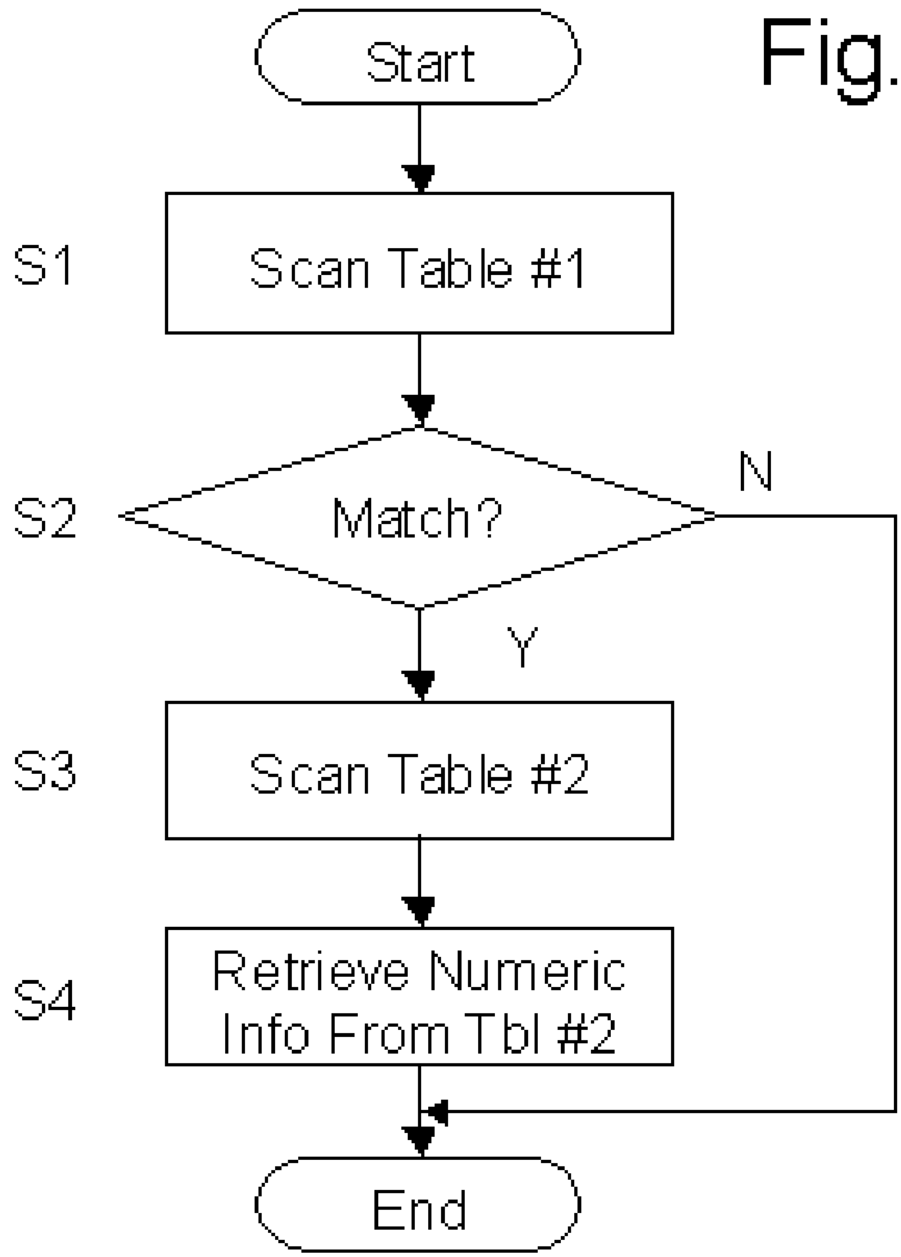
FIG. 11 is a flowchart illustrating an exemplary embodiment of the present invention.

As described in FIG. 8, RAM 206 includes Table #1 (FIG. 8) and Table #2 (FIG. 9). In FIG. 8, audio information #1 corresponds to tag 'Scott.' Namely audio information, such as wave data, which represents the sound of 'Scott' (sounds like 'S-ko-t') is registered in Table #1, which corresponds to tag 'Scott'. In the same manner audio information #2 corresponds to tag 'Carol'; audio information #3 corresponds to tag 'Peter'; audio information #4 corresponds to tag 'Amy'; and audio information #5 corresponds to tag 'Brian.' In FIG. 9, tag 'Scott' corresponds to numeric information '(916) 411-2526'; tag 'Carol' corresponds to numeric information '(418) 675-6566'; tag 'Peter' corresponds to numeric information '(220) 890-1567'; tag 'Amy' corresponds to numeric information '(615) 125-3411'; and tag 'Brian' corresponds to numeric information '(042) 645-2097.' FIG. 11 illustrates how CPU 211 (FIG. 1) operates by utilizing both Table #1 and Table #2. Once the audio data is processed as described in S4 of FIG. 6, CPU 211 scans Table #1 (S1). If the retrieved audio data matches with one of the audio information registered in Table #1 (S2), CPU 211 scans Table #2 (S3) and retrieves the corresponding numeric information from Table #2 (S4).

Figure 12:
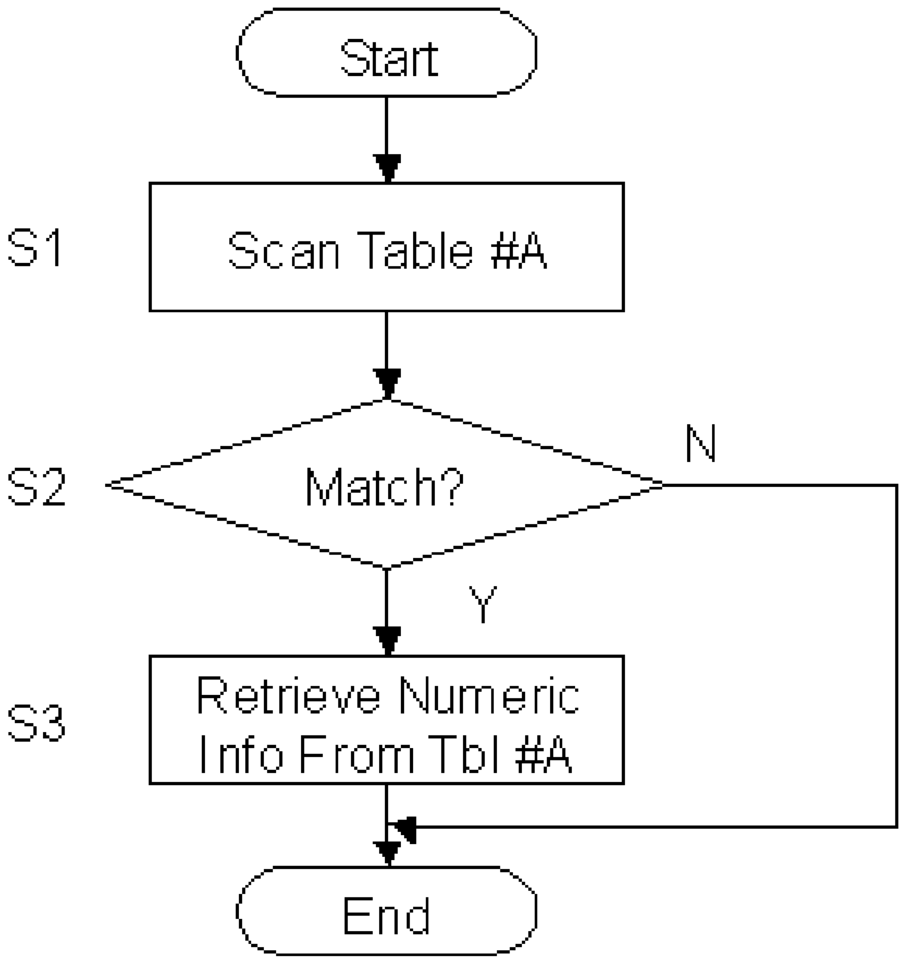
FIG. 12 is a flowchart illustrating an exemplary embodiment of the present invention.

FIG. 10 illustrates another embodiment of the present invention. Here, RAM 206 includes Table #A instead of Table #1 and Table #2 described above. In this embodiment, audio info #1 (i.e., wave data which represents the sound of 'Scot') directly corresponds to numeric information '(916) 411-2526.' In the same manner audio info #2 corresponds to numeric information '(410) 675-6566'; audio info #3 corresponds to numeric information '(220) 890-1567'; audio info #4 corresponds to numeric information '(615) 125-3411'; and audio info #5 corresponds to numeric information '(042) 645-2097.' FIG. 12 illustrates how CPU 211 (FIG. 1) operates by utilizing Table #A.

Once the audio data is processed as described in S4 of FIG. 6, CPU 211 scans Table #A (S1). If the retrieved audio data matches with one of the audio information registered in Table #A (S2), it retrieves the corresponding numeric information therefrom (S3).

As another embodiment, RAM 206 may contain only Table #2 and tag can be retrieved from the voice recognition system explained in FIGS. 3 through 7. Namely, once the audio data is processed by CPU 211 (FIG. 1) as described in S4 of FIG. 6 and retrieves the text data therefrom and detects one of the tags registered in Table #2 (e.g., 'Scot'), CPU 211 retrieves the corresponding numeric information (e.g., '(916) 411-2526') from the same table.

<<Voice Recognition Noise Filtering Function>>

Figure 13:
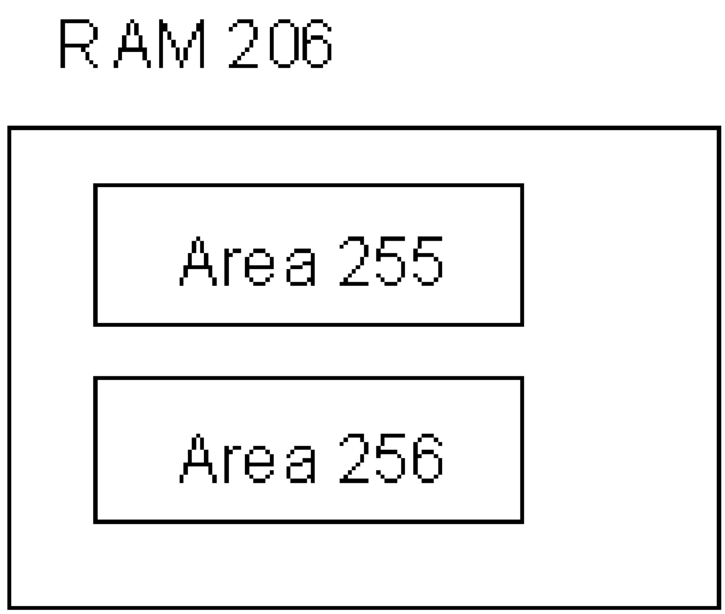
FIG. 13 is a block diagram illustrating an exemplary embodiment of the present invention.
Figure 14:
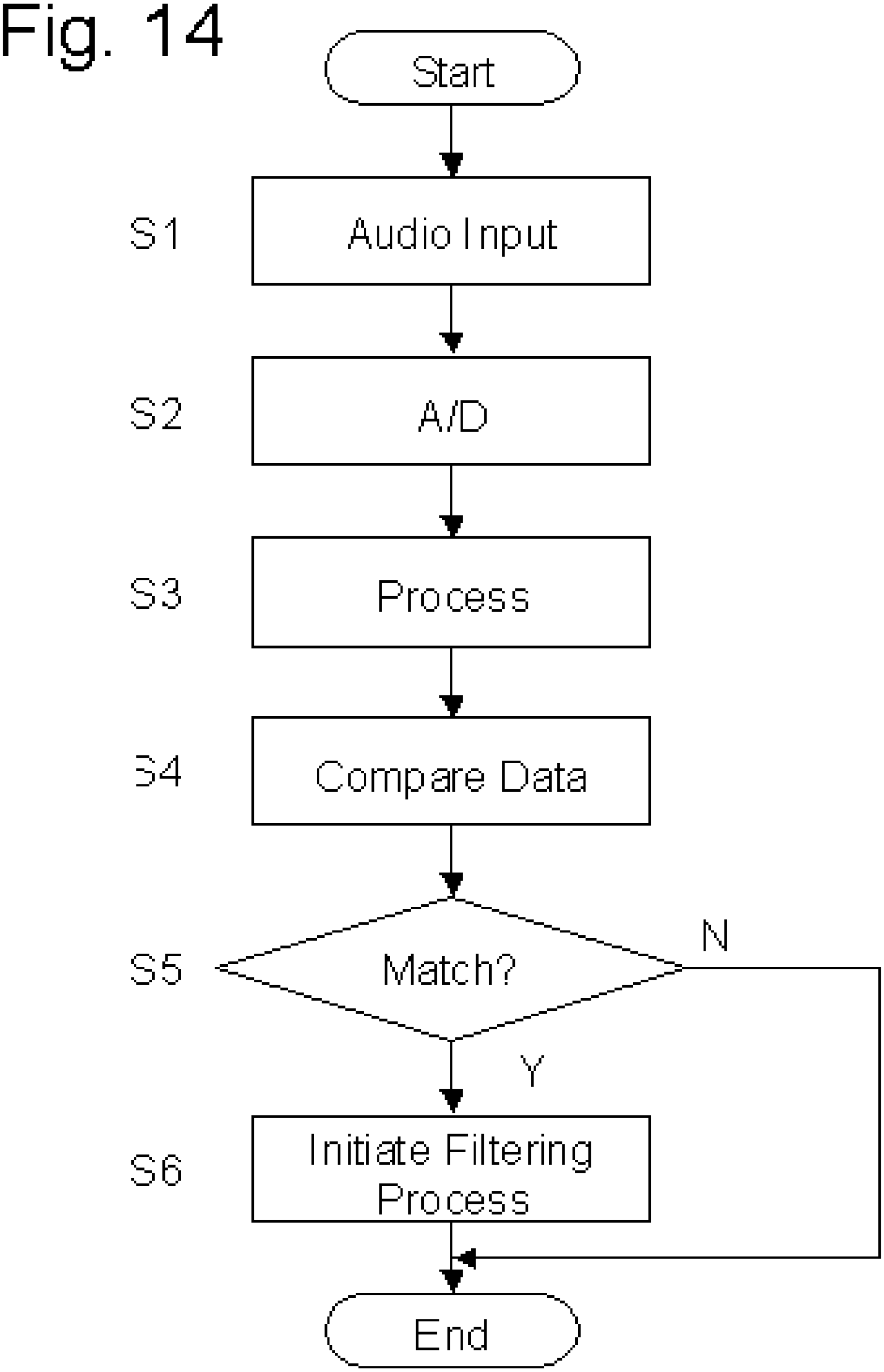
FIG. 14 is a flowchart illustrating an exemplary embodiment of the present invention.
Figure 15:
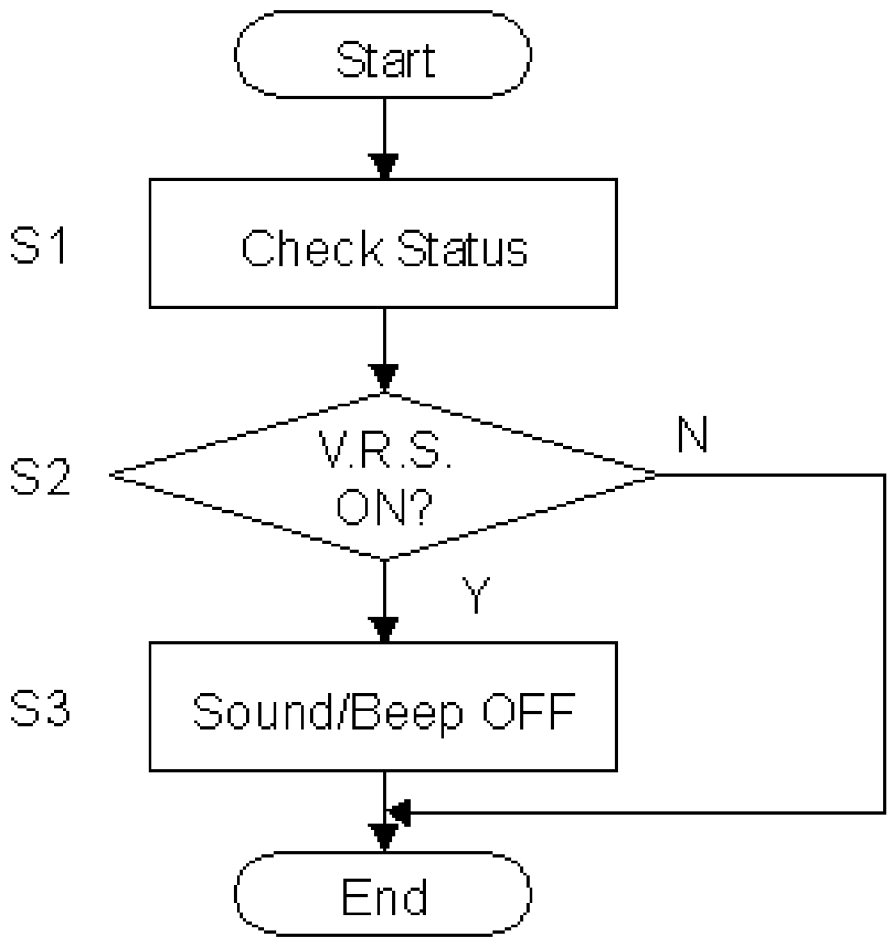
FIG. 15 is a flowchart illustrating an exemplary embodiment of the present invention.

FIGS. 13 through 15 describes the method of minimizing the undesired effect of the background noise when utilizing the voice recognition system.

As described in FIG. 13, RAM 206 (FIG. 1) includes Area 255 and Area 256. Sound audio data which represents background noise is stored in Area 255, and sound audio data which represents the beep, ringing sound and other sounds which are emitted from the Communication Device 200 are stored in Area 256.

FIG. 14 describes the method to utilize the data stored in Area 255 and Area 256 described in FIG. 13. When the voice recognition system is activated as described in FIG. 5, the analog audio data is input from Microphone 215 (FIG. 1) (S1). The analog audio data is converted into digital data by A/D 213 (FIG. 1) (S2). The digital audio data is processed by Sound Processor 205 (FIG. 1) (S3) and compared to the data stored in Area 255 and Area 256 (S4). Such comparison can be done by either Sound Processor 205 or CPU 211 (FIG. 1).

If the digital audio data matches to the data stored in Area 255 and/or Area 256, the filtering process is initiated and the matched portion of the digital audio data is deleted as background noise. Such sequence of process is done before retrieving text and numeric information from the digital audio data.

Figure 14A:
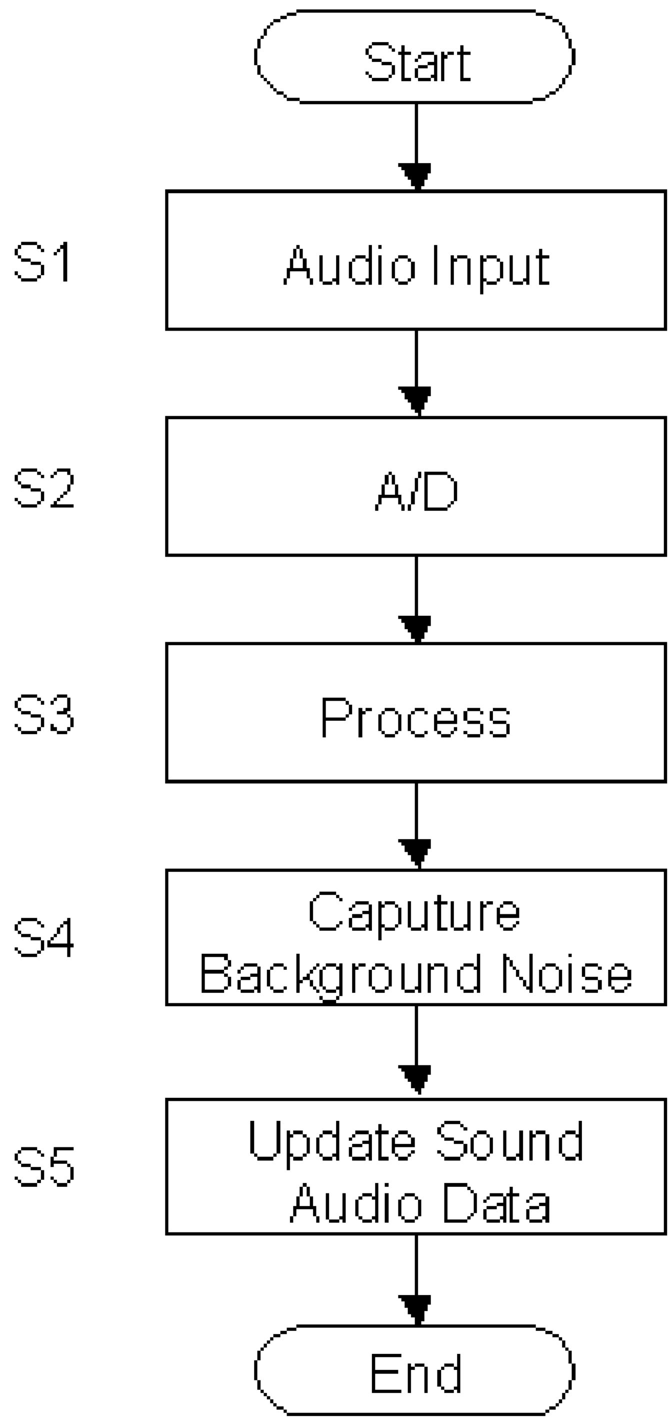
FIG. 14*a* is a flowchart illustrating an exemplary embodiment of the present invention.

FIG. 14*a* describes the method of updating Area 255. When the voice recognition system is activated as described in FIG. 5, the analog audio data is input from Microphone 215 (FIG. 1) (S1). The analog audio data is converted into digital data by A/D 213 (FIG. 1) (S2). The digital audio data is processed by Sound Processor 205 (FIG. 1) or CPU 211 (FIG. 1) (S3) and the background noise is captured (S4). CPU 211 (FIG. 1) scans Area 255 and if the captured background noise is not registered in Area 255, it updates the sound audio data stored therein (S5).

FIG. 15 describes another embodiment of the present invention. CPU 211 (FIG. 1) routinely checks whether the voice recognition system is activated (S1). If the system is activated (S2), the beep, ringing sound, and other sounds which are emitted from Communication Device 200 are automatically turned off in order to minimize the miss recognition process of the voice recognition system (S3).

<<Voice Recognition Auto-Off Function>>

Figure 16:
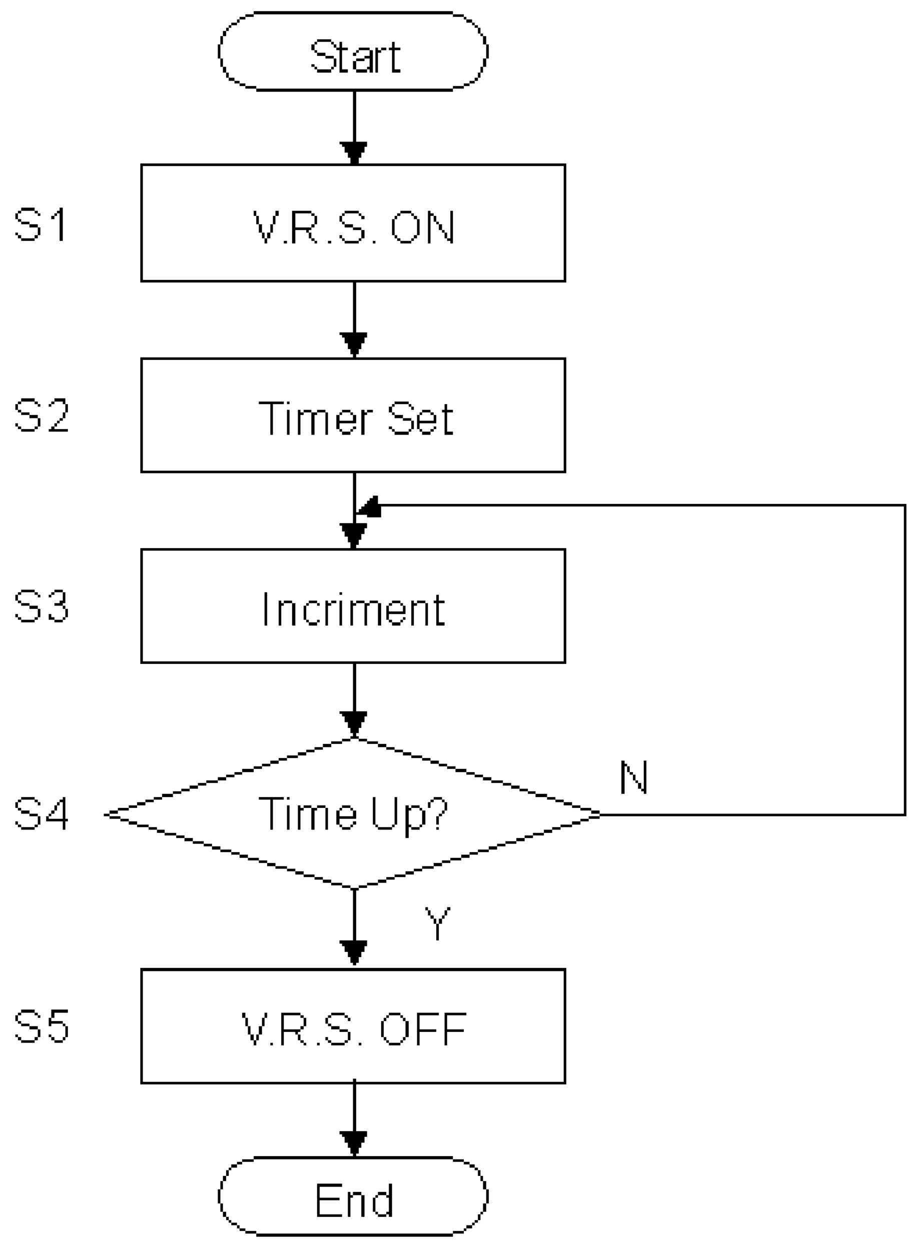
FIG. 16 is a flowchart illustrating an exemplary embodiment of the present invention.

The voice recognition system can be automatically turned off to avoid glitch as described in FIG. 16. When the voice recognition system is activated (S1), CPU 211 (FIG. 1) automatically sets a timer (S2). The value of timer (i.e., the length of time until the system is deactivated) can be set manually by the user. The timer is incremented periodically (S3), and if the incremented time equals to the predetermined value of time as set in S2 (S4), the voice recognition system is automatically deactivated (S5).

<<Voice Recognition Email Function (1)>>

Figure 17A:
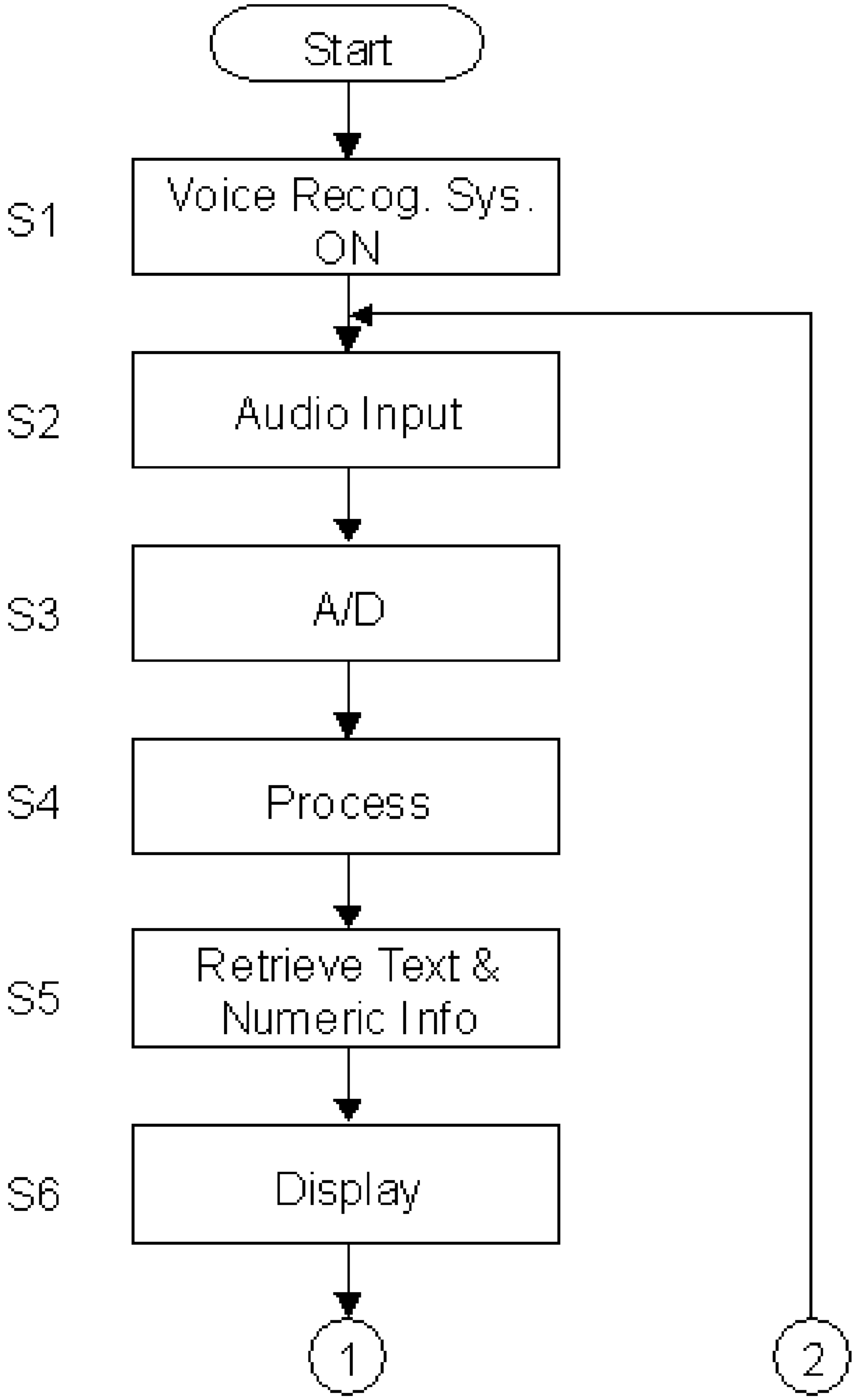
FIG. 17*a* is a flowchart illustrating an exemplary embodiment of the present invention.
Figure 17B:
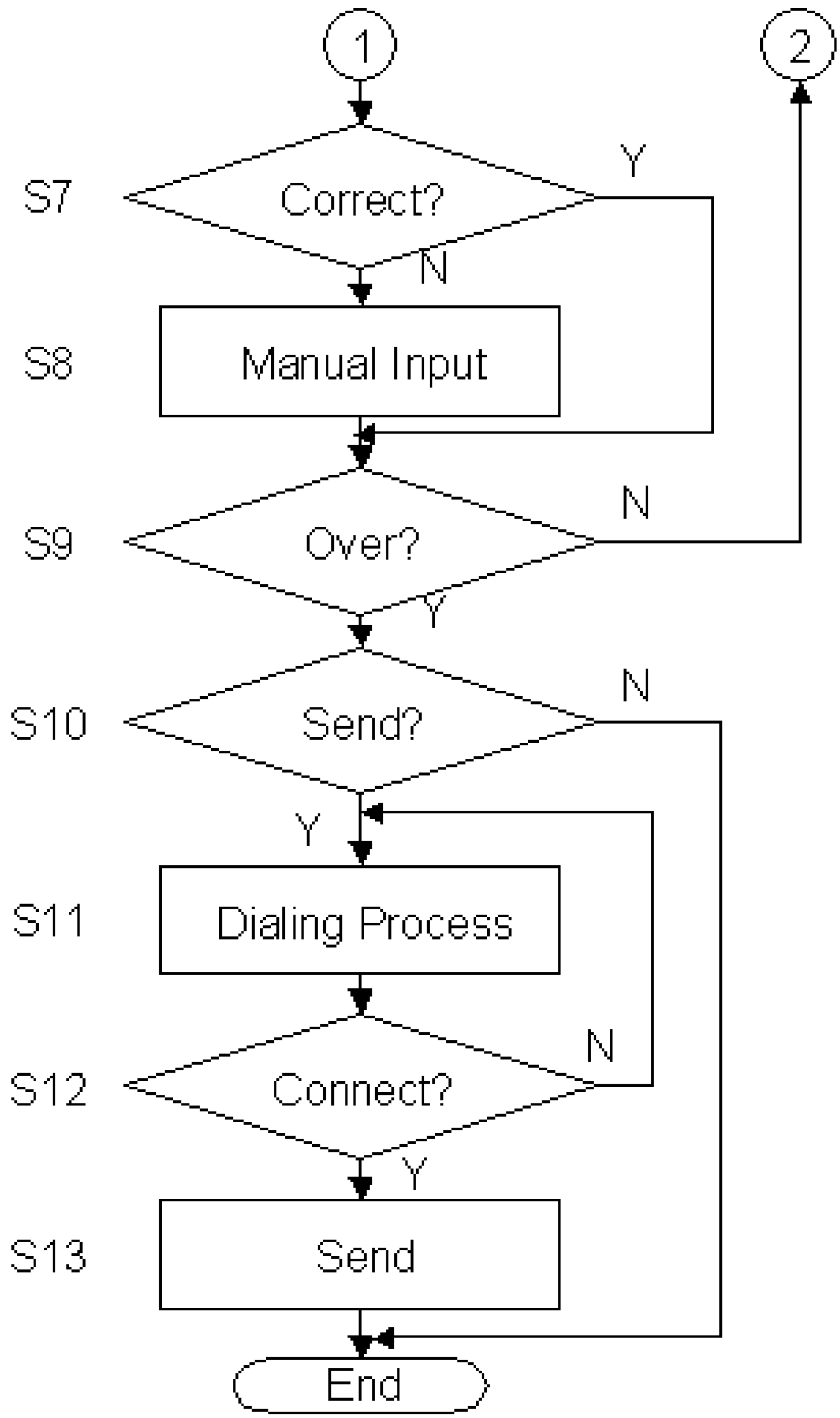
FIG. 17*b* is a flowchart illustrating an exemplary embodiment of the present invention.

FIGS. 17*a* and 17*b* illustrate the first embodiment of the function of typing and sending e-mails by utilizing the voice recognition system. Once the voice recognition system is activated (S1), the analog audio data is input from Microphone 215 (FIG. 1) (S2). The analog audio data is converted into digital data by A/D 213 (FIG. 1) (S3). The digital audio data is processed by Sound Processor 205 (FIG. 1) or CPU 211 (FIG. 1) to retrieve the text and numeric information therefrom (S4). The text and numeric information are retrieved (S5) and are displayed on LCD 201 (FIG. 1) (S6). If the retrieved information is not correct (S7), the user can input the correct text and/or numeric information manually by using the Input Device 210 (FIG. 1) (S8). If inputting the text and numeric information is completed (S9) and CPU 211 detects input signal from Input Device 210 to send the e-mail (S10), the dialing process is initiated (S11). The dialing process is repeated until Communication Device 200 is connected to Host H (S12), and the e-mail is sent to the designated address (S13).

<<Voice Recognition—Speech-to-Text Function>>

Figure 18:
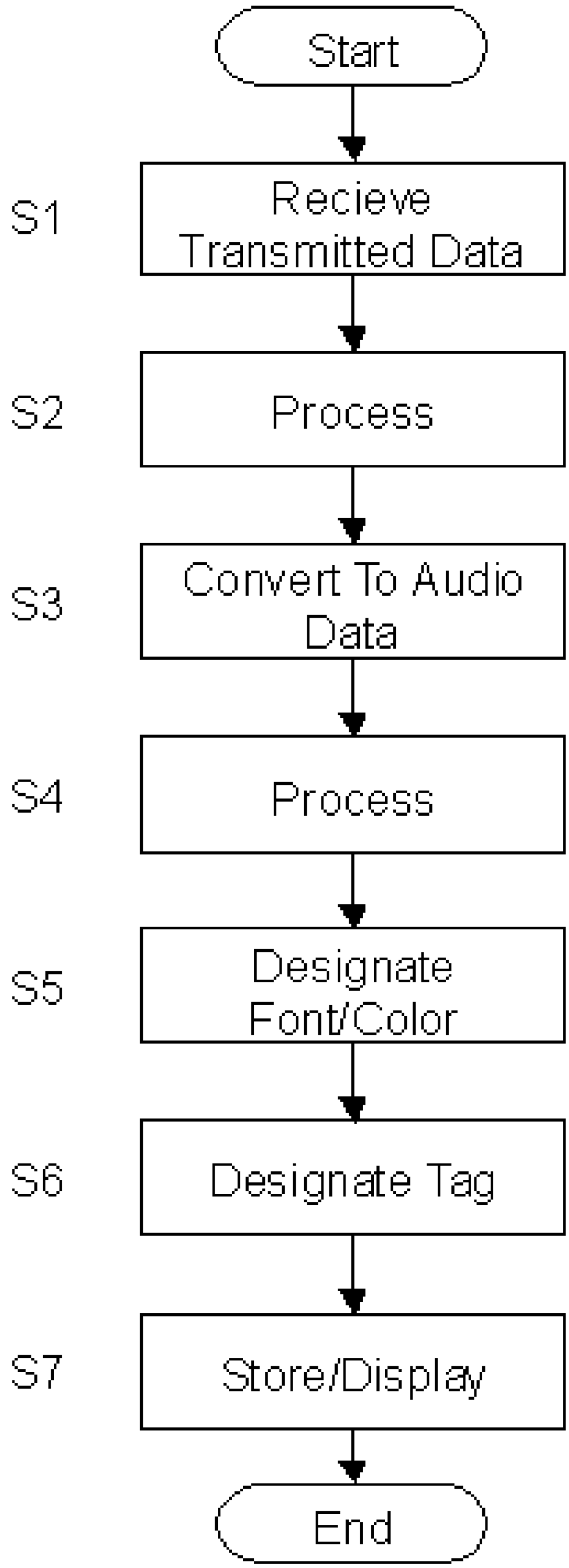
FIG. 18 is a flowchart illustrating an exemplary embodiment of the present invention.

FIG. 18 illustrates the speech-to-text function of Communication Device 200 (FIG. 1).

Once Communication Device 200 receives a transmitted data from another device via Antenna 218 (FIG. 1) (S1), Signal Processor 208 (FIG. 1) processes the data (e.g., wireless signal error check and decompression) (S2), and the transmitted data is converted into digital audio data (S3). Such conversion can be rendered by either CPU 211 (FIG. 1) or Signal Processor 208. The digital audio data is transferred to Sound Processor 205 (FIG. 1) via Data Bus 203 and text and numeric information are retrieved therefrom (S4). CPU 211 designates the predetermined font and color to the text and numeric information (S5) and also designates a tag to such information (S6). After these tasks are completed the tag and the text and numeric information are stored in RAM 206 and displayed on LCD 201 (S7).

Figure 19:
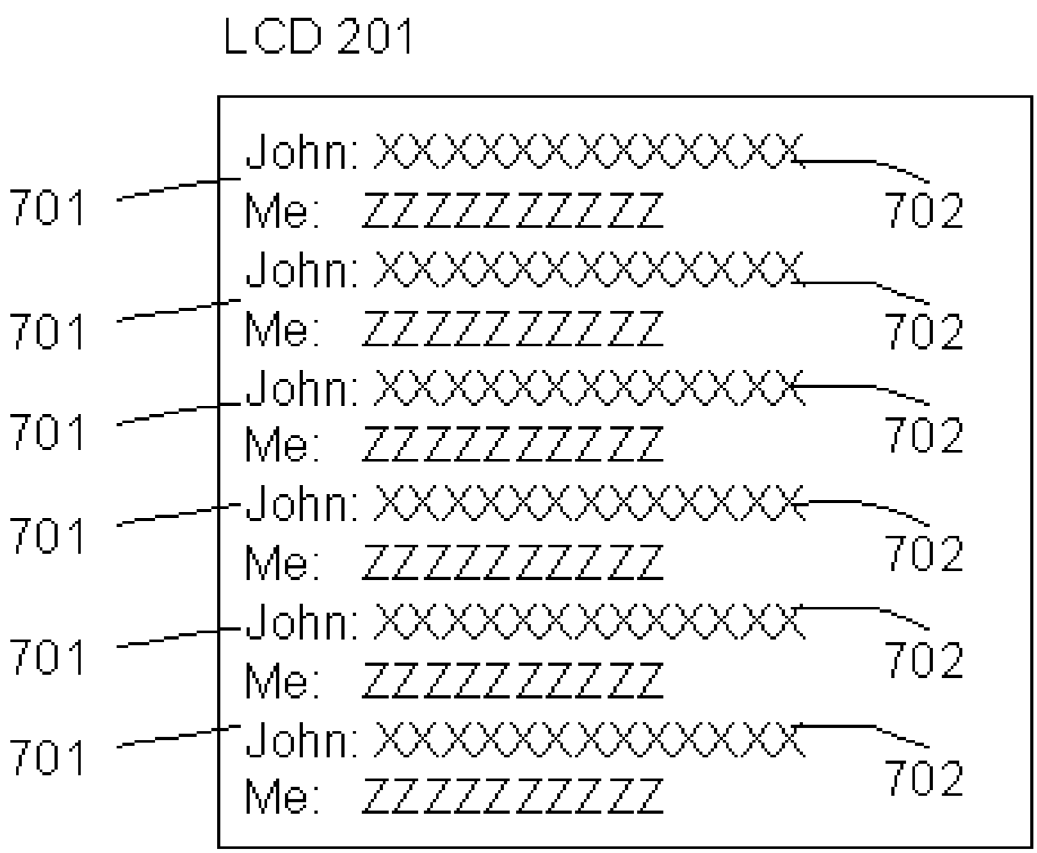
FIG. 19 is a simplified illustration illustrating an exemplary embodiment of the present invention.

FIG. 19 illustrates how the text and numeric information as well as the tag are displayed. On LCD 201 the text and numeric information 702 ('XXXXXXXXX') are displayed with the predetermined font and color as well as with the tag 701 ('John').

<<Voice Recognition—Summary>>

The foregoing inventions may be summarized as the following.

(1) A communication device which has a function to retrieve text and numeric information from a user's voice input from a microphone wherein said function is deactivated when said communication device is connected to another device in order to avoid undesired operation of said communication device.

(2) A communication device which has a function to retrieve text and numeric information from a user's voice input from a microphone wherein said communication device retrieves a numeric information from said user's voice and initiates a dialing process by utilizing said numeric information thereby enabling said user to initiate said dialing process only by his/her voice and/or by without physically contacting said communication device.

(3) A communication device which has a function to retrieve text and numeric information from a user's voice input from a microphone wherein said communication device retrieves audio information from which numeric information can not be retrieved from said user's voice and retrieves predetermined corresponding numeric information therefrom thereby enabling said user to initiate a dialing process in a convenient manner and without memorizing said numeric information or without referring to other sources for said information.

(4) A communication device which has a function to retrieve text and numeric information from a user's voice input from a microphone wherein said communication device compares audio information retrieved from said user's voice with pre-stored audio data and erases said audio data from said audio information before retrieving text and numeric information therefrom thereby enabling said function to be more accurate and minimizing error in retrieving said text and numeric information.

(5) A communication device which has a function to retrieve text and numeric information from a user's voice input from a microphone wherein said communication device retrieves text and numeric information from data transmitted from another device and displays said text and numeric information with predetermined font and color thereby enabling the user to visually confirm the content of conversation by way of observing the said text and numeric information displayed.

(6) A wireless communication device comprising a microphone, a display, an input device, an antenna, an alphanumeric data modification means and, a voice recognition system, wherein when said voice recognition system is activated and said wireless communication is in an email producing mode to produce an email, a series of audio data is input from said microphone and said voice recognition system converts said series of audio data into a first series of alphanumeric data which are displayed on said display, said first series of alphanumeric data are modified by said alphanumeric data modification means to a second series of alphanumeric data when said second series of alphanumeric data are input from said input device, said email including said second series of alphanumeric data is transmitted in a wireless manner from said antenna.

<<Positioning System>>

Figure 20A:
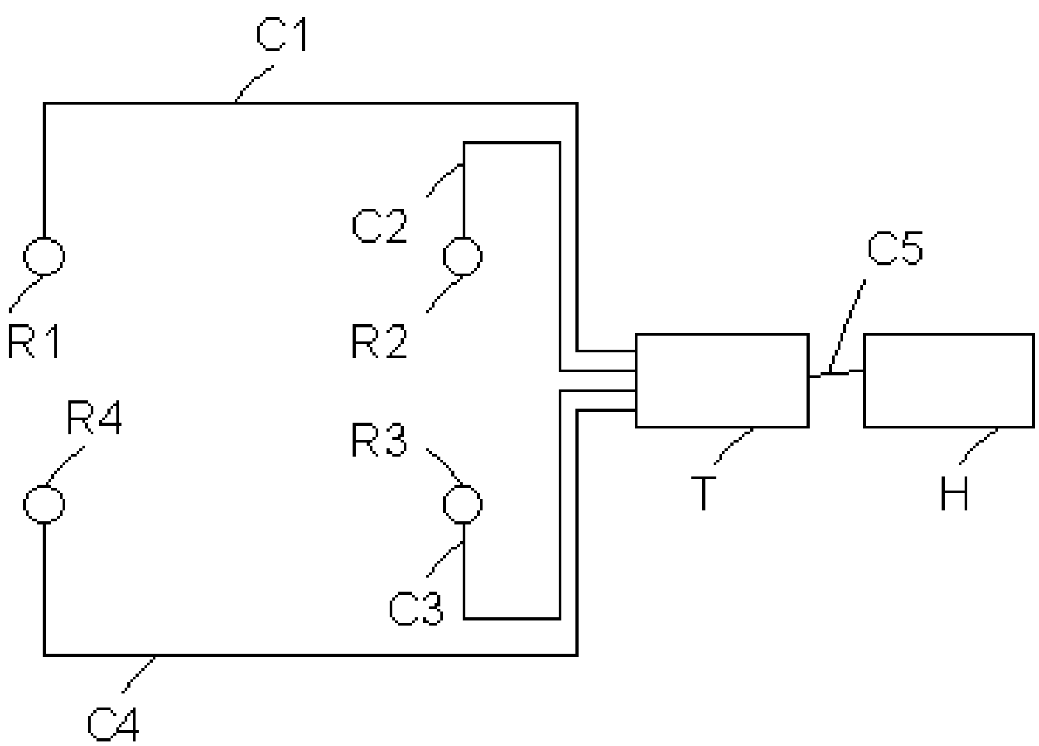
FIG. 20*a* is a simplified illustration illustrating an exemplary embodiment of the present invention.

FIG. 20*a* illustrates the simplified block diagram to detect the position of Communication Device 200 (FIG. 1).

Figure 20B:
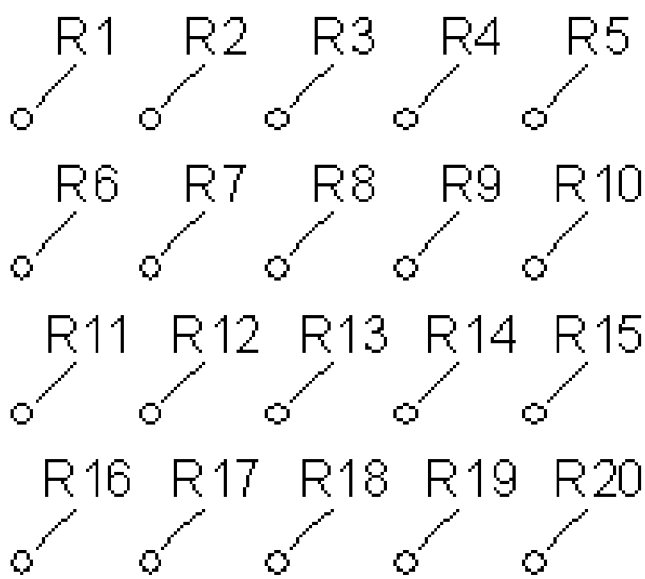
FIG. 20*b* is a simplified illustration illustrating an exemplary embodiment of the present invention.

In FIG. 20*a*, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 20*b*. The system illustrated in FIG. 20*a* and FIG. 20*b* is designed to pinpoint the position of Communication Device 200 by using the method so-called 'global positioning system' or 'GPS.' Such function can be enabled by the technologies primarily introduced in the following inventions and the references cited thereof: U.S. Pat. No. 6,429,814; U.S. Pat. No. 6,427,121; U.S. Pat. No. 6,427,120; U.S. Pat. No. 6,424,826; U.S. Pat. No. 6,415,227; U.S. Pat. No. 6,415,154; U.S. Pat. No. 6,411,811; U.S. Pat. No. 6,392,591; U.S. Pat. No. 6,389,291; U.S. Pat. No. 6,369,751; U.S. Pat. No. 6,347,113; U.S. Pat. No. 6,324,473; U.S. Pat. No. 6,301,545; U.S. Pat. No. 6,297,770; U.S. Pat. No. 6,278,404; U.S. Pat. No. 6,275,771; U.S. Pat. No. 6,272,349; U.S. Pat. No. 6,266,012; U.S. Pat. No. 6,259,401; U.S. Pat. No. 6,243,647; U.S. Pat. No. 6,236,354; U.S. Pat. No. 6,233,094; U.S. Pat. No. 6,232,922; U.S. Pat. No. 6,211,822; U.S. Pat. No. 6,188,351; U.S. Pat. No. 6,182,927; U.S. Pat. No. 6,163,567; U.S. Pat. No. 6,101,430; U.S. Pat. No. 6,084,542; U.S. Pat. No. 5,971,552; U.S. Pat. No. 5,963,167; U.S. Pat. No. 5,944,770; U.S. Pat. No. 5,890,091; U.S. Pat. No. 5,841,399; U.S. Pat. No. 5,808,582; U.S. Pat. No. 5,777,578; U.S. Pat. No. 5,774,831; U.S. Pat. No. 5,764,184; U.S. Pat. No. 5,757,786; U.S. Pat. No. 5,736,961; U.S. Pat. No. 5,736,960; U.S. Pat. No. 5,594,454; U.S. Pat. No. 5,585,800; U.S. Pat. No. 5,554,994; U.S. Pat. No. 5,535,278; U.S. Pat. No. 5,534,875; U.S. Pat. No. 5,519,620; U.S. Pat. No. 5,506,588; U.S. Pat. No. 5,446,465; U.S. Pat. No. 5,434,574; U.S. Pat. No. 5,402,441; U.S. Pat. No. 5,373,531; U.S. Pat. No. 5,349,531; U.S. Pat. No. 5,347,286; U.S. Pat. No. 5,341,301; U.S. Pat. No. 5,339,246; U.S. Pat. No. 5,293,170; U.S. Pat. No. 5,225,842; U.S. Pat. No. 5,223,843; U.S. Pat. No. 5,210,540; U.S. Pat. No. 5,193,064; U.S. Pat. No. 5,187,485; U.S. Pat. No. 5,175,557; U.S. Pat. No. 5,148,452; U.S. Pat. No. 5,134,407; U.S. Pat. No. 4,928,107; U.S. Pat. No. 4,928,106; U.S. Pat. No. 4,785,463; U.S. Pat. No. 4,754,465; U.S. Pat. No. 4,622,557; and U.S. Pat. No. 4,457,006. Relays R1 through R20 are preferably located on ground, however, are also permitted to be installed in artificial satellites as described in the foregoing patents and the references cited thereof in order to cover wider geographical range. The Relays may also be installed in houses, buildings, bridges, boats, ships, submarines, airplanes, and spaceships. In addition, Host H may be carried by houses, buildings, bridges, boats, ships, submarines, airplanes, and spaceships. In stead of utilizing Cables C1 through C5, Relays R1 through R20 (and other relays described in this specification) may be connected to Transmitter T in a wireless fashion, and Transmitter T may be connected to Host H in a wireless fashion.

FIGS. 21 through 26 illustrate how the positioning system is performed. Assuming that Device A, Communication Device 200, seeks to detect the position of Device B, another Communication Device 200, which is located somewhere in the matrix of Relays illustrated in FIG. 20*b*.

Figure 21:
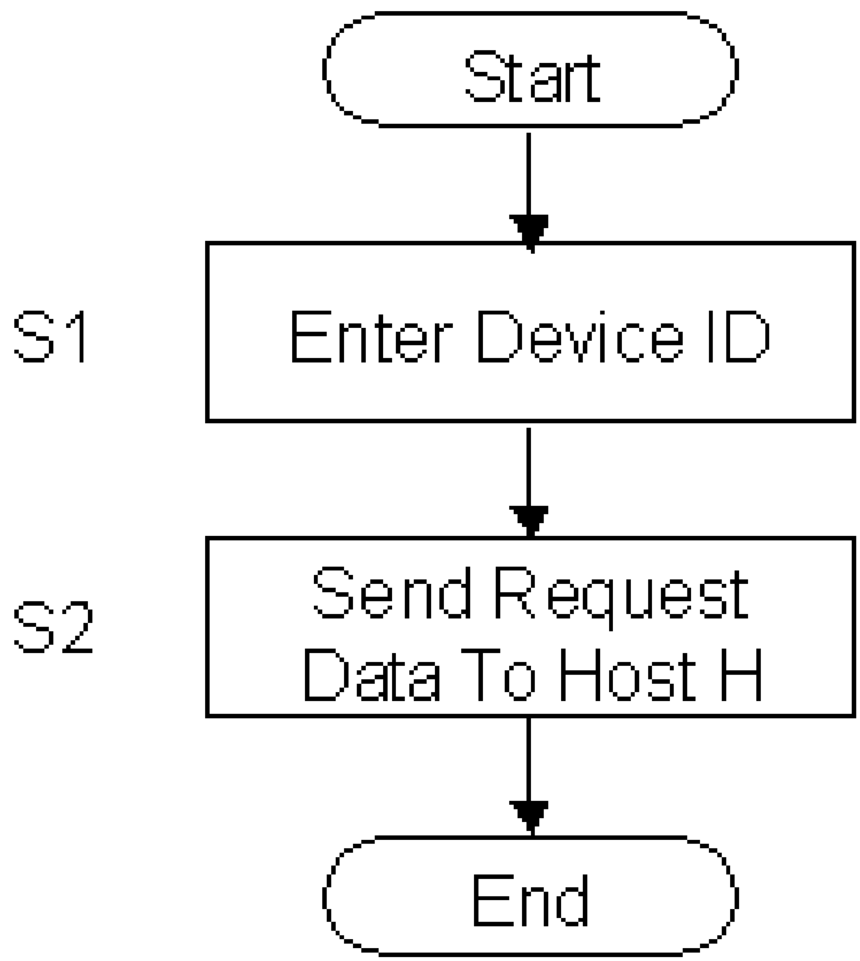
FIG. 21 is a flowchart illustrating an exemplary embodiment of the present invention.

As described in FIG. 21, first of all the device ID of Device B is entered by utilizing Input Device 210 (FIG. 1) or the voice recognition system of Device A installed therein (S1). The device ID may be its corresponding phone number. A request data including the device ID is sent to Host H (FIG. 20*a*) from Device A (S2).

Figure 22:
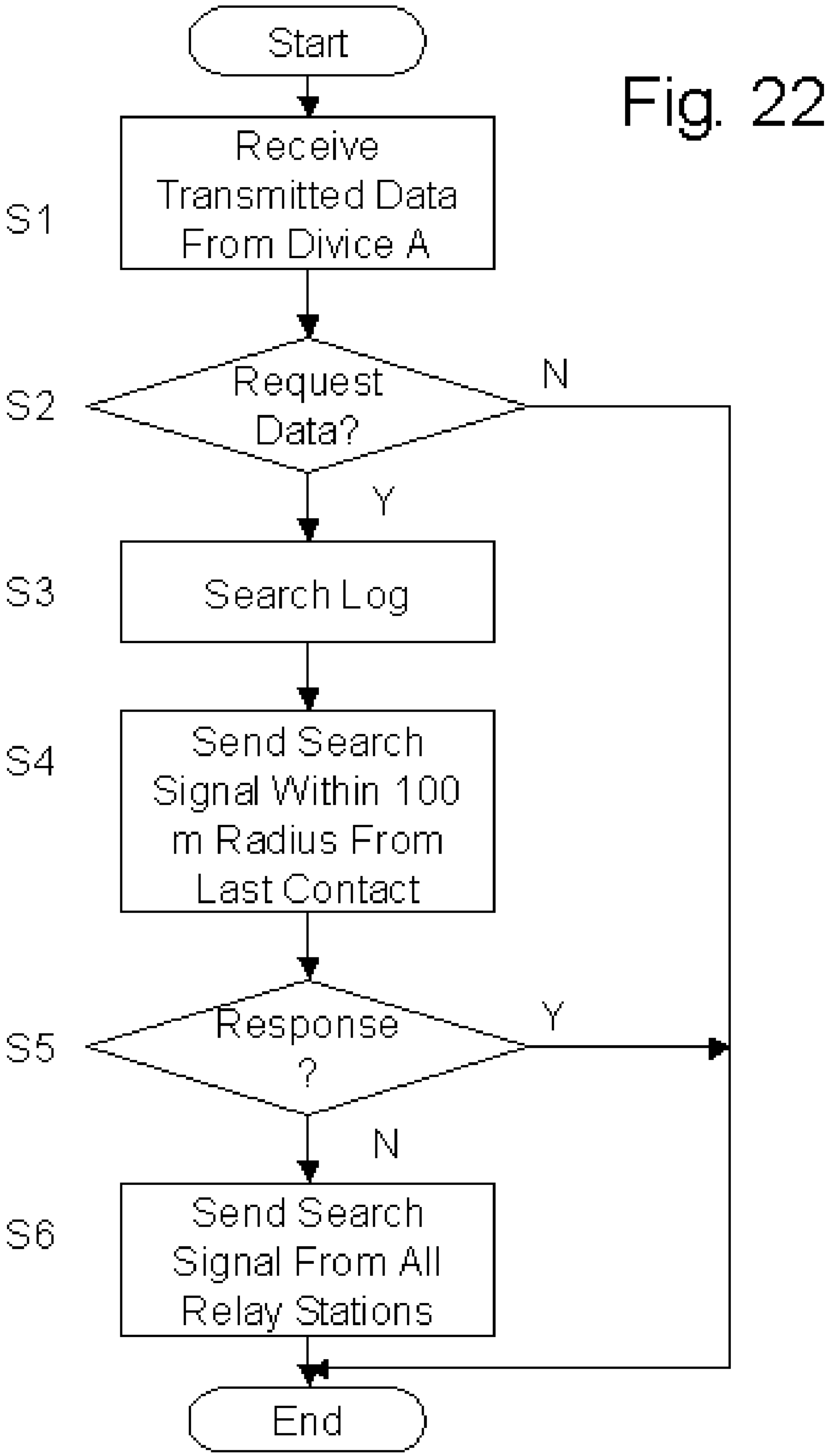
FIG. 22 is a flowchart illustrating an exemplary embodiment of the present invention.

As illustrated in FIG. 22, Host H (FIG. 20*a*) periodically receives data from Device A (S1). If the received data is a request data (S2), Host H, first of all, searches its communication log which records the location of Device B when it last communicated with Host H (S3). Then Host H sends search signal from the Relays described in FIG. 20*b* which are located within 100-meter radius from the location registered in the communication log. If there is no response from Device B (S5), Host H sends a search signal from all Relays (from R1 to R20 in FIG. 20*b*) (S6).

Figure 23:
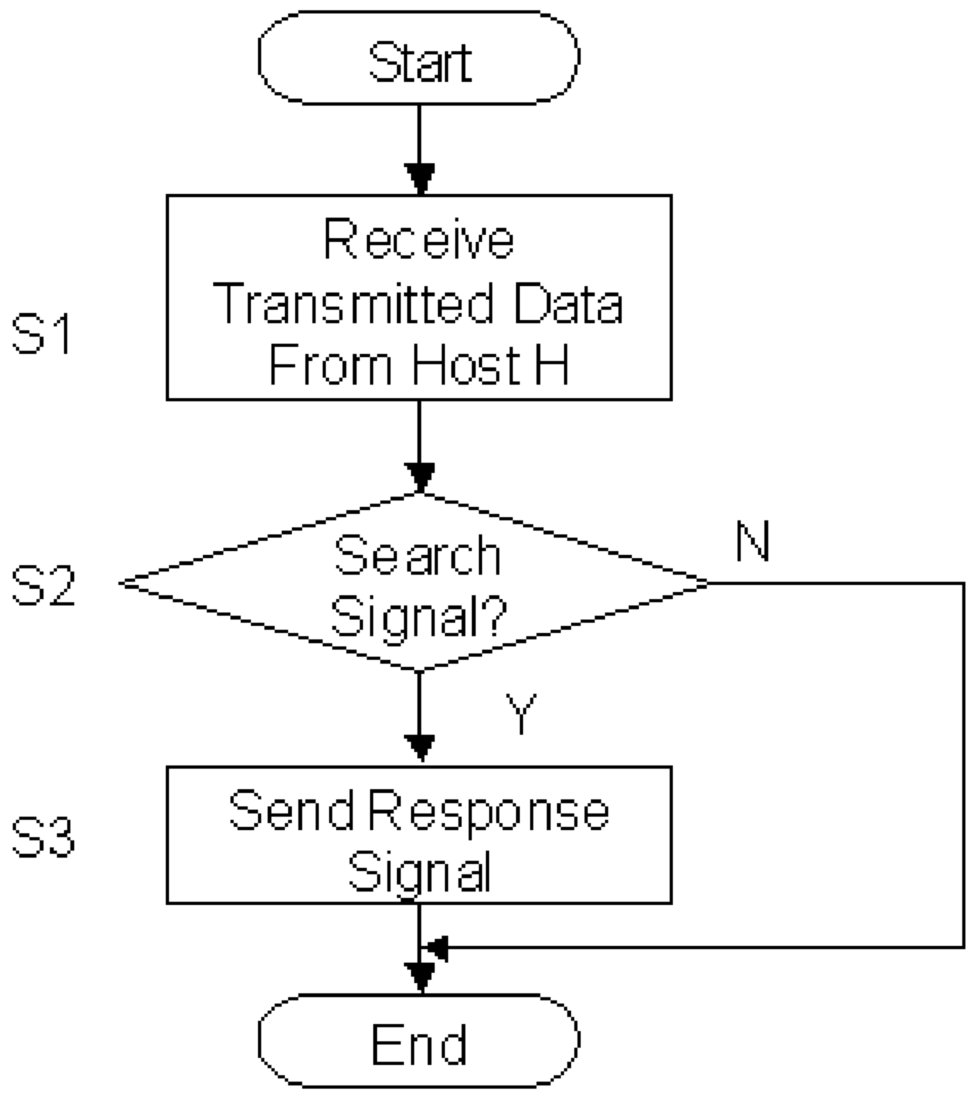
FIG. 23 is a flowchart illustrating an exemplary embodiment of the present invention.

As illustrated in FIG. 23, Device B periodically receives data from Host H (FIG. 20*a*) (S1). If the data received is a search signal (S2), Device B sends a response signal to Host H (S3).

Figure 24:
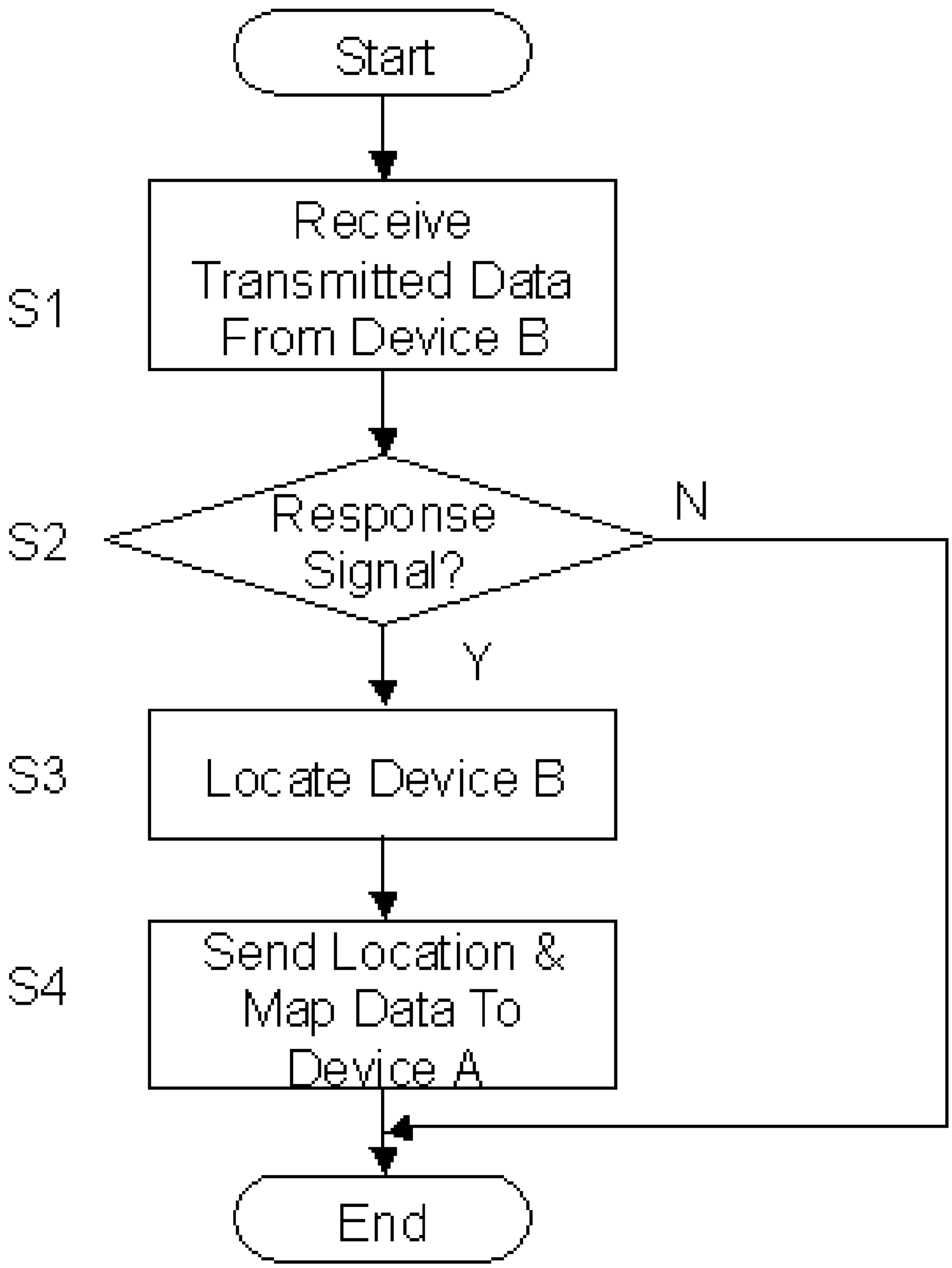
FIG. 24 is a flowchart illustrating an exemplary embodiment of the present invention.

As illustrated in FIG. 24 Host H (FIG. 20*a*) periodically receives data from Device B (S1). If the data received is a response signal (S2), Host H locates the geographic position of Device B by utilizing the method described in FIGS. 20*a* and 20*b* (S3), and sends the location data and the relevant map data of the area where Device B is located to Device A (S4).

Figure 25:
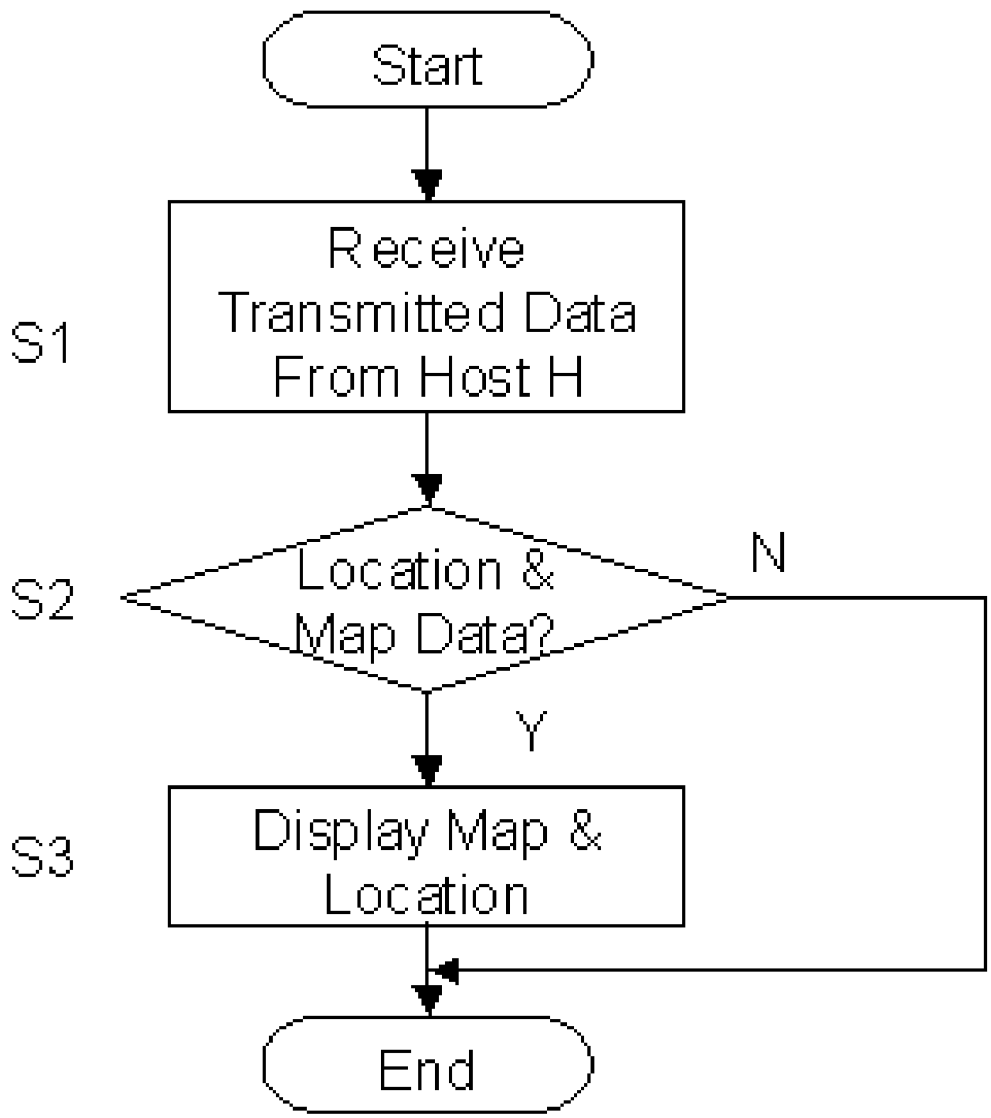
FIG. 25 is a flowchart illustrating an exemplary embodiment of the present invention.

As illustrated in FIG. 25, Device A periodically receives data from Host H (FIG. 20*a*) (S1). If the data received is the location data and the relevant map data mentioned above (S2), Device A displays the map based on the relevant map data and indicates the current location of Device B thereon based on the location data received (S3).

Figure 26:
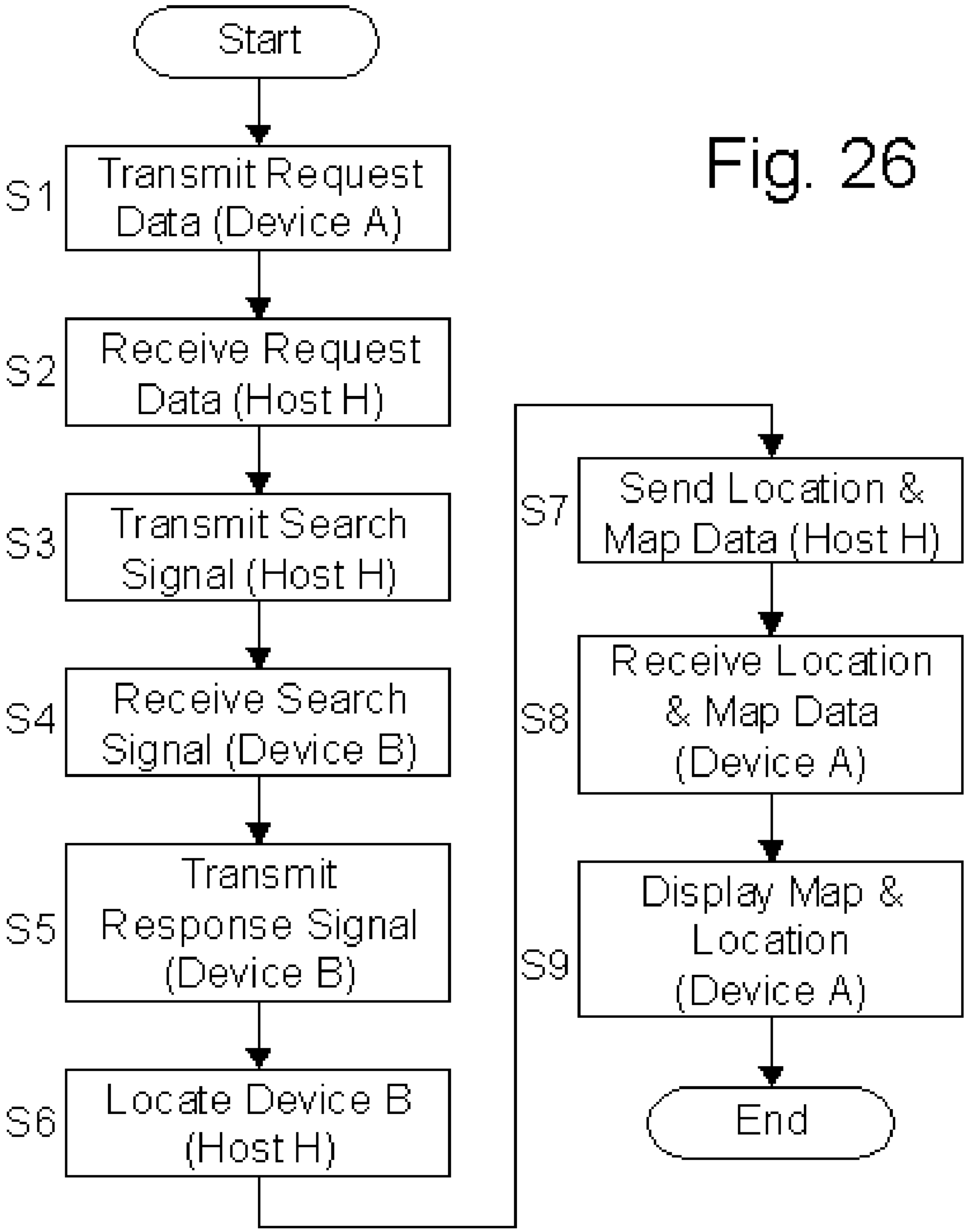
FIG. 26 is a flowchart illustrating an exemplary embodiment of the present invention.

Device A can continuously track down the current location of Device B as illustrated in FIG. 26. First, Device A sends a request data to Host H (FIG. 20*a*) (S1). As soon as Host H receives the request data (S2), it sends a search signal in the manner illustrated in FIG. 22 (S3). As soon as Device B receives the search signal (S4), it sends a response signal to Host H (S5). Based on the response signal, Host H locates the geographic location of Device B with the method described in FIGS. 20*a* and 20*b* (S6). Then Host H sends to Device A a renewed location data and a relevant map data of the area where Device B is currently located (S7). As soon as these data are received (S8), Device A displays the map based on the relevant map data and indicates the updated location based on the renewed location data (S9). If Device B is still within the specified area Device A may use the original relevant map data. As another embodiment of the present invention, S1 through S4 may be omitted and make Device B send a response signal continuously to Host H until Host H sends a command signal to Device B to cease sending the response signal.

<<Positioning System—Automatic Silent Mode>>

FIGS. 27*a* through 32*g* illustrate the automatic silent mode of Communication Device 200 (FIG. 1).

Figure 27A:
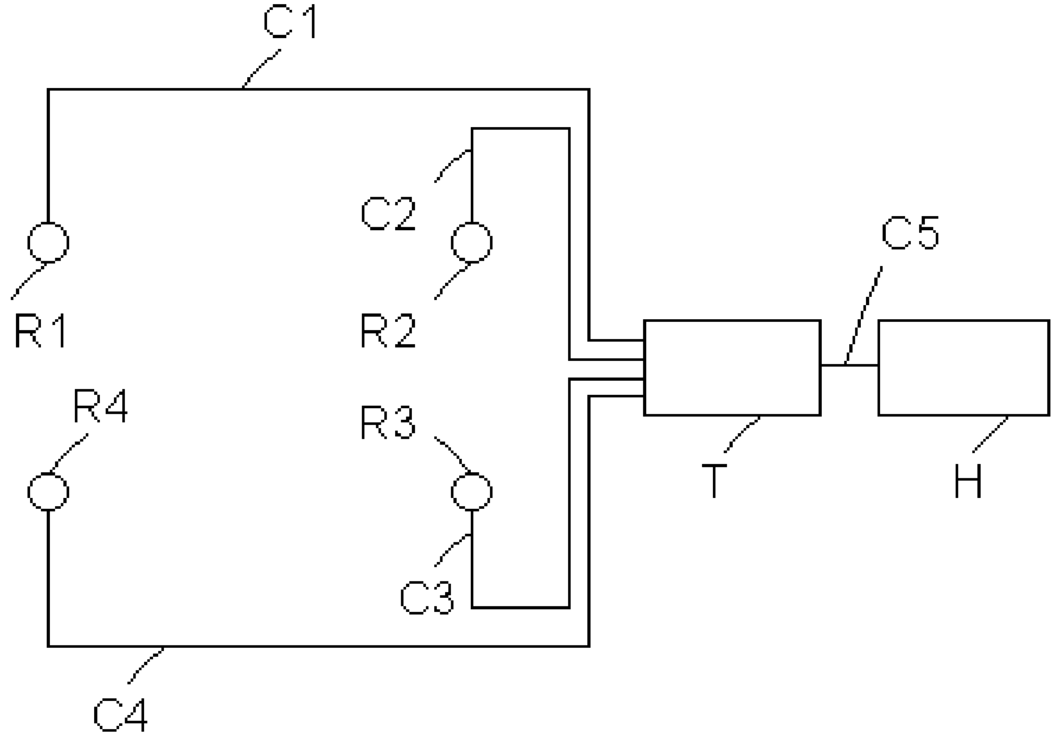
FIG. 27*a* is a simplified illustration illustrating an exemplary embodiment of the present invention.
Figure 27B:
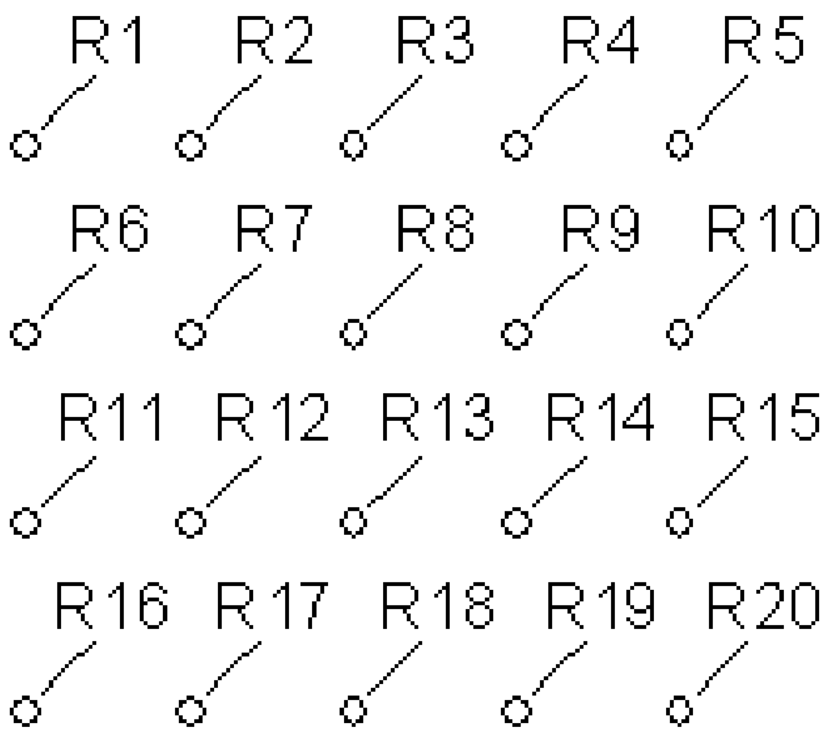
FIG. 27*b* is a simplified illustration illustrating an exemplary embodiment of the present invention.

In FIG. 27*a*, Relay R1 is connected to Cable C1, Relay R2 is connected to Cable C2, Relay R3 is connected to Cable C3, and Relay R4 is connected to Cable C4. Cables C1, C2, C3, and C4 are connected to Transmitter T, which is connected to Host H by Cable C5. The Relays (R1 through R 20) are located throughout the predetermined area in the pattern illustrated in FIG. 27*b*. The system illustrated in FIGS. 27*a* and 27*b* is designed to pinpoint the position of Communication Device 200 by using the method so-called 'global positioning system' or 'GPS.' As stated hereinbefore, such function can be enabled by the technologies primarily introduced in the inventions in the foregoing patents and the references cited thereof. The Relays R1 through R20 are preferably located on ground, however, are also permitted to be installed in artificial satellites as described in the foregoing patents and the references cited thereof in order to cover wider geographical range. In addition, Host H may be carried by an artificial satellite and utilize the formation as described in FIGS. 2*a*, 2*b*, and 2*c*.

Figure 28:
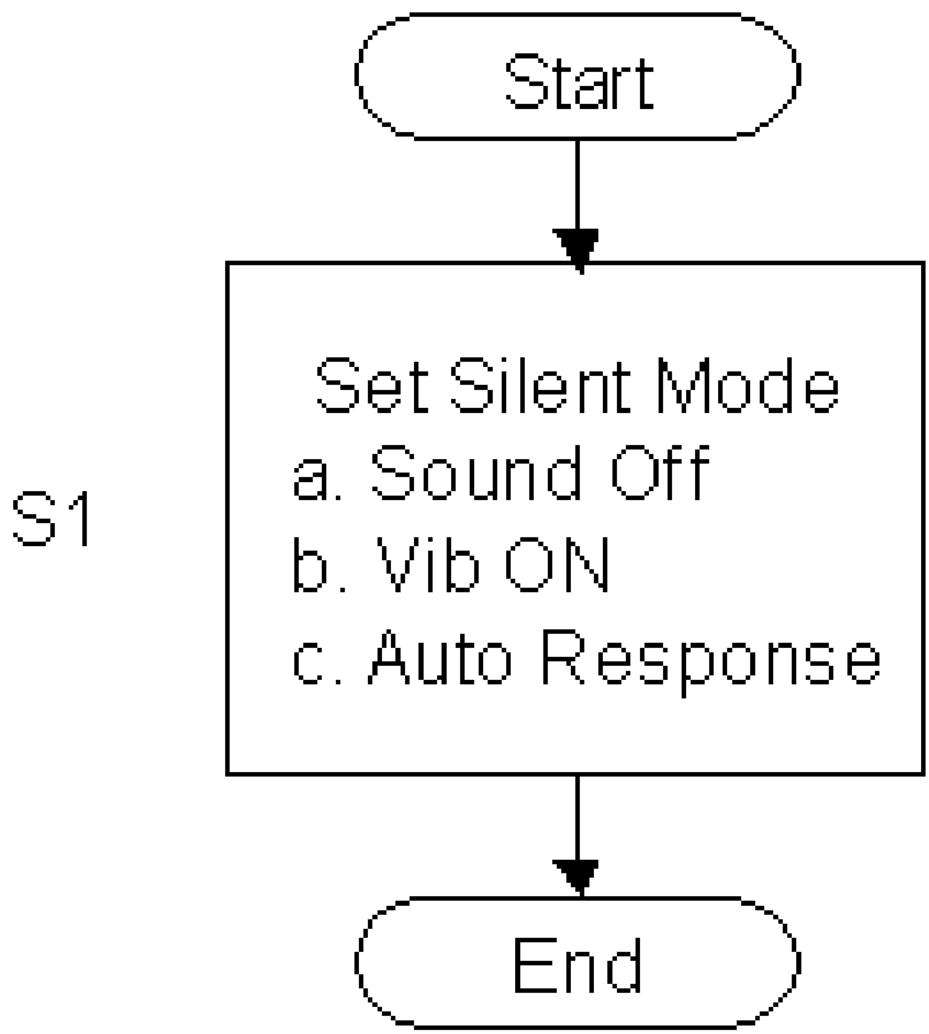
FIG. 28 is a flowchart illustrating an exemplary embodiment of the present invention.

As illustrated in FIG. 28, the user of Communication Device 200 may set the silent mode by Input Device 210 (FIG. 1) or by utilizing the voice recognition system installed therein. When Communication Device 200 is in the silent mode, (a) the ringing sound is turned off, (b) Vibrator 217 (FIG. 1) activates when Communication Device 200 receives call, and/or (c) Communication Device 200 sends an automatic response to the caller device when a call is received (S1). The user may, at his discretion, select any of these predetermined functions of the automatic silent mode.

Figure 29:
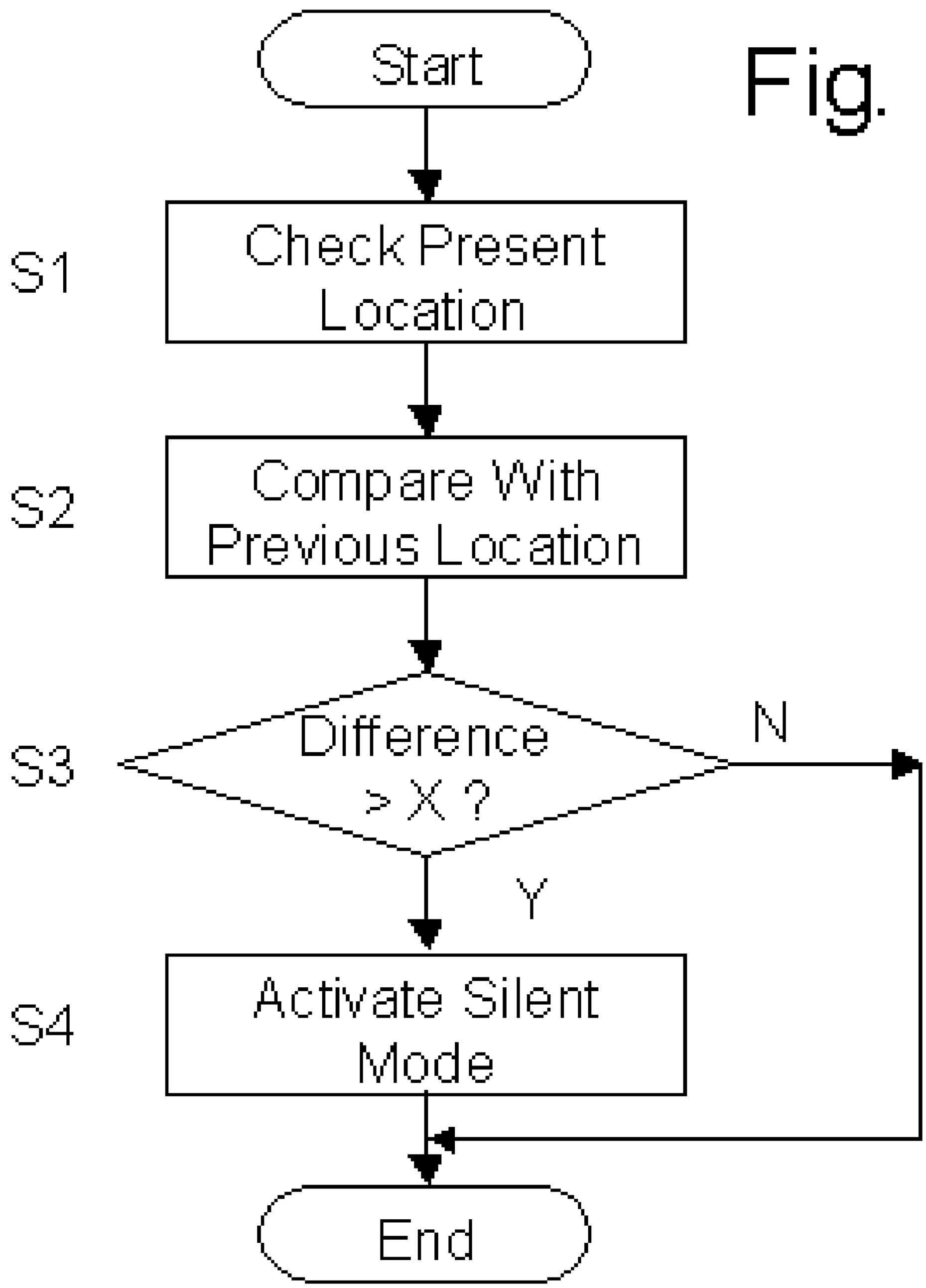
FIG. 29 is a flowchart illustrating an exemplary embodiment of the present invention.

FIG. 29 illustrates how the automatic silent mode is activated. Communication Device 200 periodically checks its present location with the method so-called 'global positioning system' or 'GPS' by using the system illustrated in FIGS. 27*a* and 27*b* (S1). Communication Device 200 then compares the present location and the previous location (S2). If the difference of the two values is more than the specified amount X, i.e., when the moving velocity of Communication Device 200 exceeds the predetermined value (S3), the silent mode is activated and (a) the ringing sound is automatically turned off, (b) Vibrator 217 (FIG. 1) activates, and/or (c) Communication Device 200 sends an automatic response to the caller device according to the user's setting (S4). Here, the silent mode is automatically activated because the user of Communication Device 200 is presumed to be on an automobile and is not in a situation to freely answer the phone, or the user is presumed to be riding a train and does not want to disturb other passengers.

Figure 30:
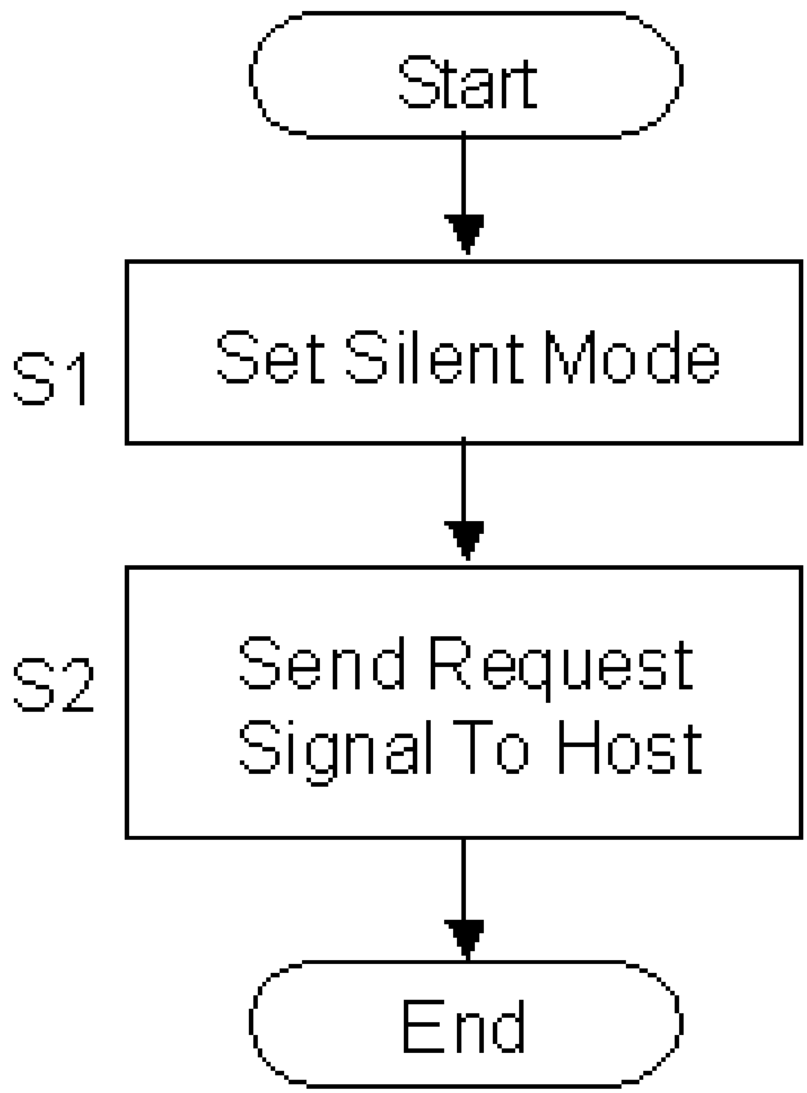
FIG. 30 is a flowchart illustrating an exemplary embodiment of the present invention.

As another embodiment of the present invention, the automatic silent mode may be administered by Host H (FIG. 27*a*). As illustrated in FIG. 30, the silent mode is set in the manner described in FIG. 28 (S1) and Communication Device 200 sends to Host H a request signal indicating that it is in the silent mode (S2).

Figure 31:
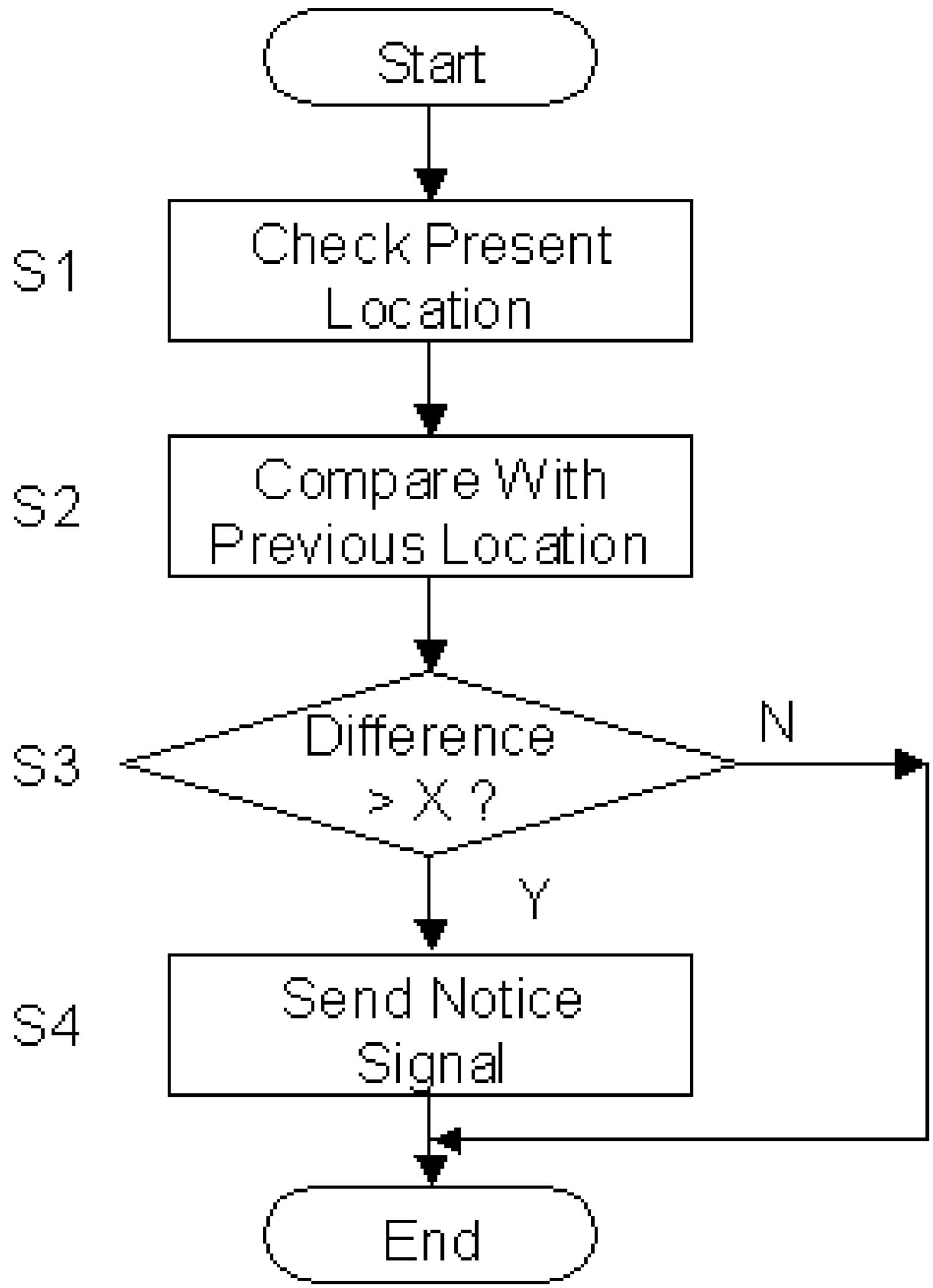
FIG. 31 is a flowchart illustrating an exemplary embodiment of the present invention.

As described in FIG. 31, when Host H (FIG. 27*a*) detects a call to Communication Device 200 after receiving the request signal, it checks the current location of Communication Device 200 (S1) and compares it with the previous location (S2). If the difference of the two values is more than the specified amount X, i.e., when the moving velocity of Communication Device 200 exceeds the predetermined value (S3), Host H sends a notice signal to Communication Device 200 indicating that it has received an incoming call (S4).

Figure 32:
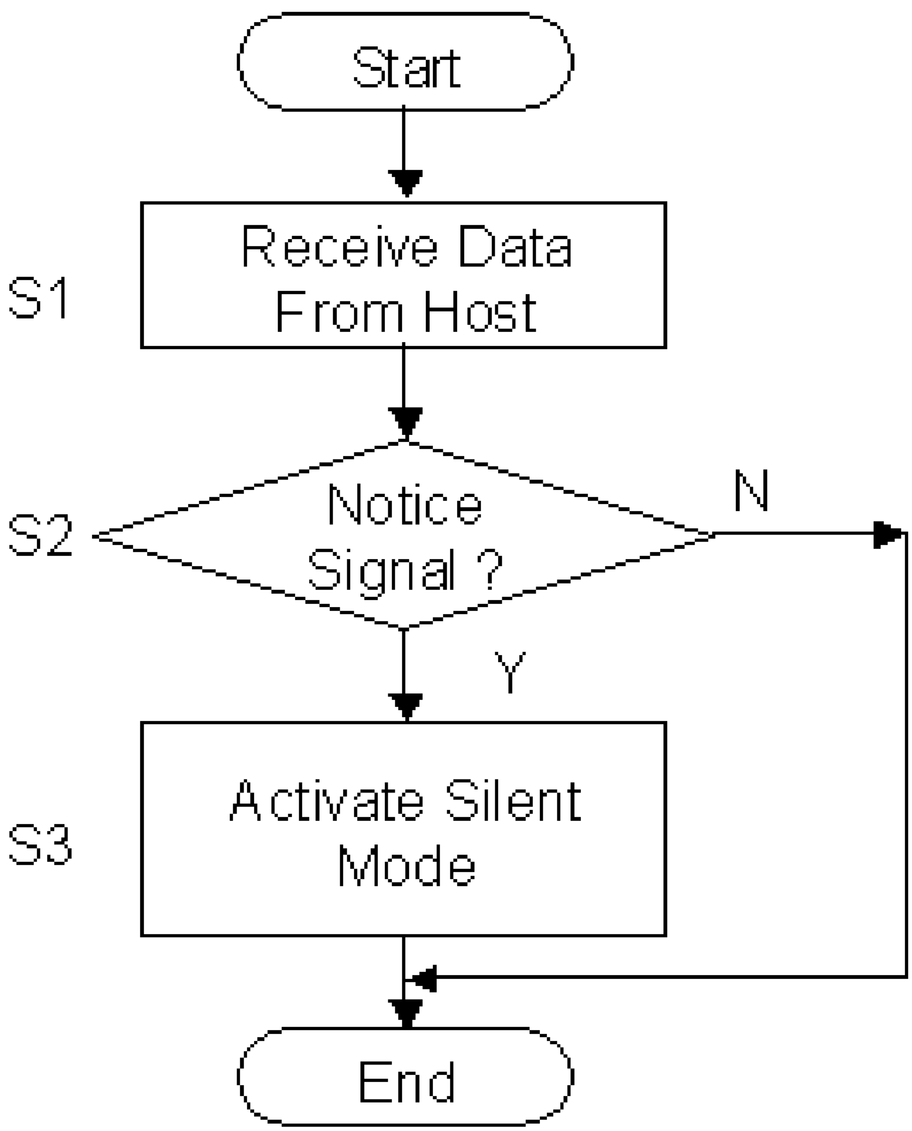
FIG. 32 is a flowchart illustrating an exemplary embodiment of the present invention.

As illustrated in FIG. 32, Communication Device 200 receives data periodically from Host H (FIG. 27*a*) (S1). If the received data is a notice signal (S2), Communication Device 200 activates the silent mode (S3) and (a) the ringing sound is automatically turned off, (b) Vibrator 217 (FIG. 1) activates, and/or (c) Communication Device 200 sends an automatic response to the caller device according to the user's setting. The automatic response may be sent from Host H instead.

Figure 32A:
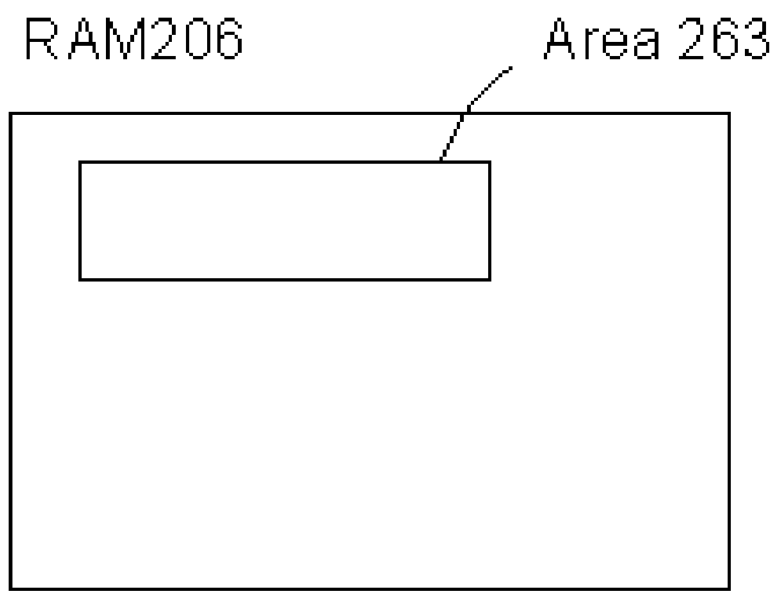
FIG. 32*a* is a block diagram illustrating an exemplary embodiment of the present invention.
Figure 32B:
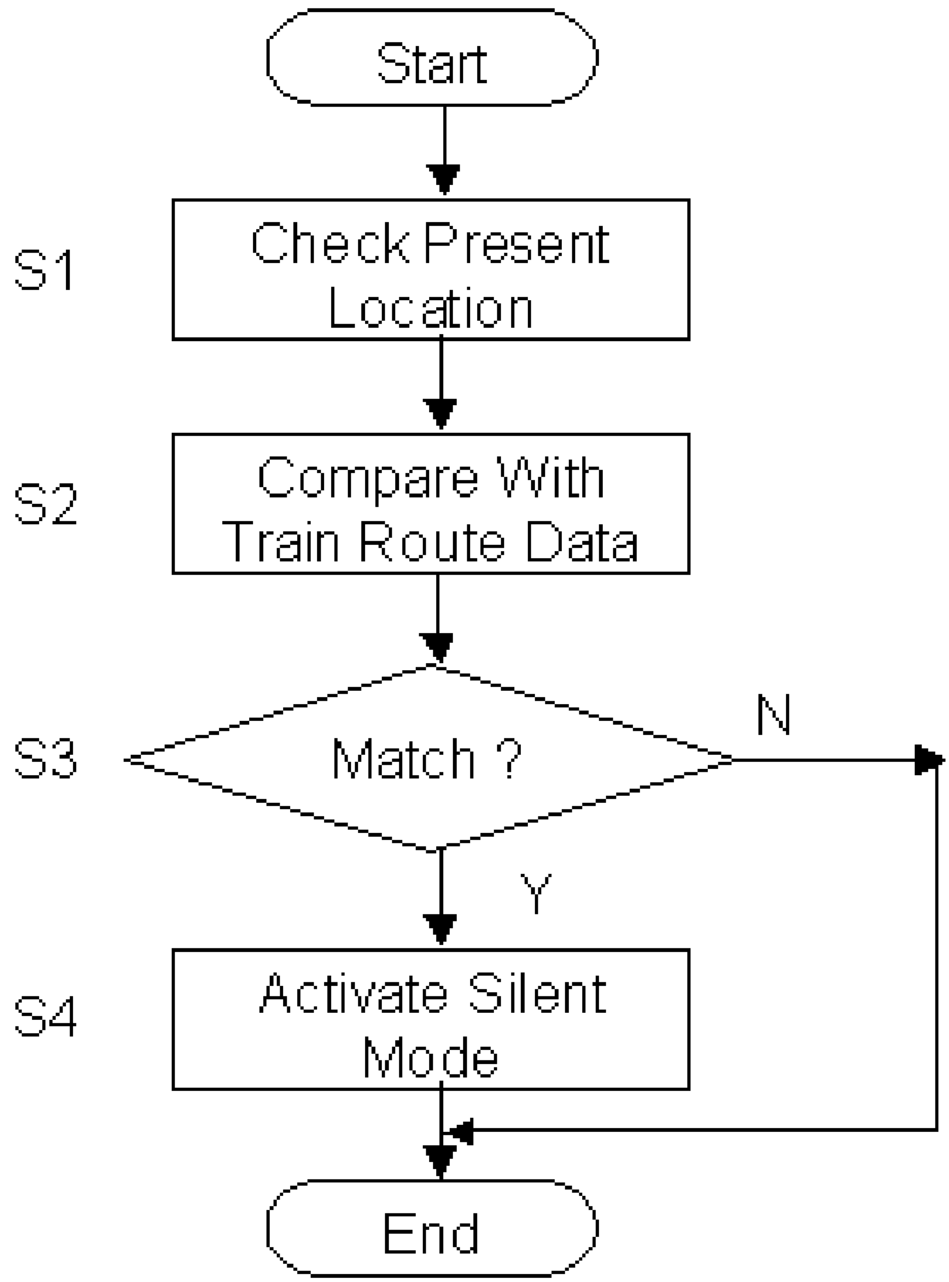
FIG. 32*b* is a flowchart illustrating an exemplary embodiment of the present invention.

As another embodiment of the present invention, a train route data may be utilized. As illustrated in FIG. 32*a*, a train route data is stored in Area 263 of RAM 206. The train route data contains three-dimensional train route map including the location data of the train route. FIG. 32*b* illustrates how the train route data is utilized. CPU 211 (FIG. 1) periodically checks the present location of Communication Device 200 by the method described in FIGS. 27*a* and 27*b* (S1). Then CPU 211 compares with the train route data stored in Area 263 of RAM 206 (S2). If the present location of Communication Device 200 matches the train route data (i.e., if Communication Device 200 is located on the train route) (S3), the silent mode is activated in the manner described above (S4). The silent mode is activated because the user of Communication Device 200 is presumed to be currently on a train and may not want to disturb the other passengers on the same train.

Figure 32C:
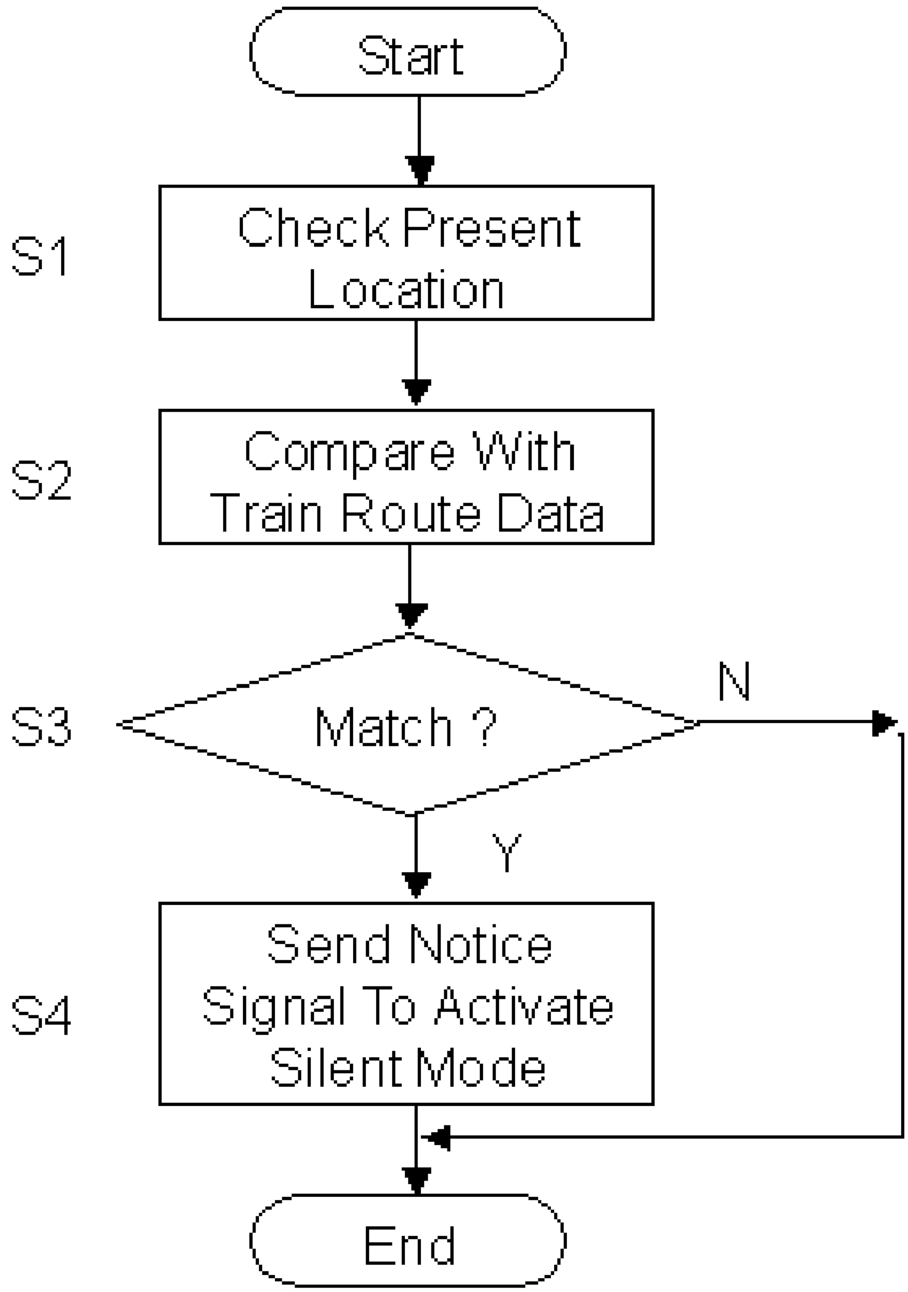
FIG. 32*c* is a flowchart illustrating an exemplary embodiment of the present invention.

As another embodiment of the present invention, such function can be delegated to Host H (FIG. 27*a*) as described in FIG. 32*c*. Namely, Host H (FIG. 27*a*) periodically checks the present location of Communication Device 200 by the method described in FIGS. 27*a* and 27*b* (S1). Then Host H compares the present location with the train route data stored in its own storage (not shown) (S2). If the present location of communication 200 matches the train route data (i.e., if Communication Device 200 is located on the train route) (S3) Host H sends a notice signal to Communication Device 200 thereby activating the silent mode in the manner described above (S4).

Figure 32D:
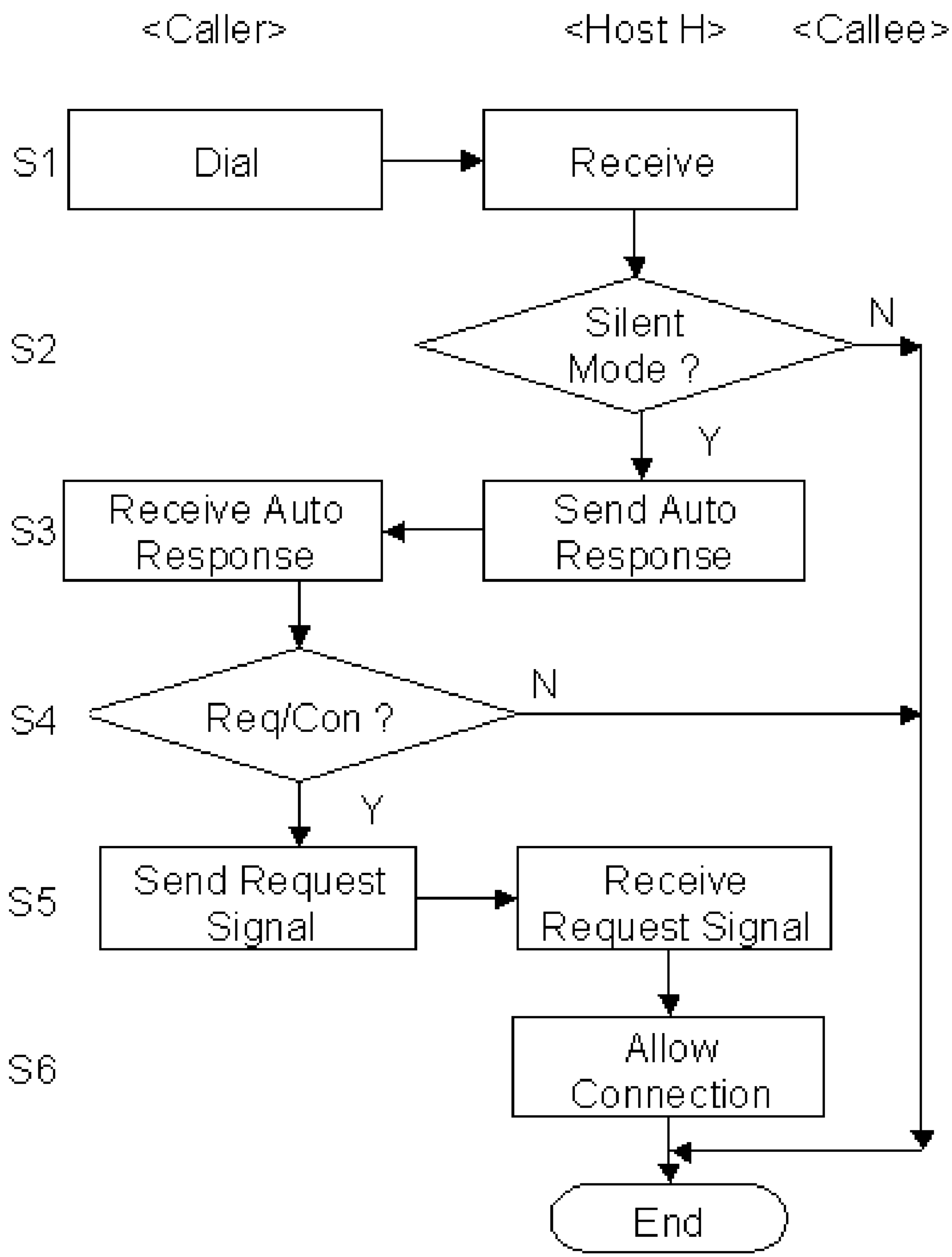
FIG. 32*d* is a flowchart illustrating an exemplary embodiment of the present invention.
Figure 32E:
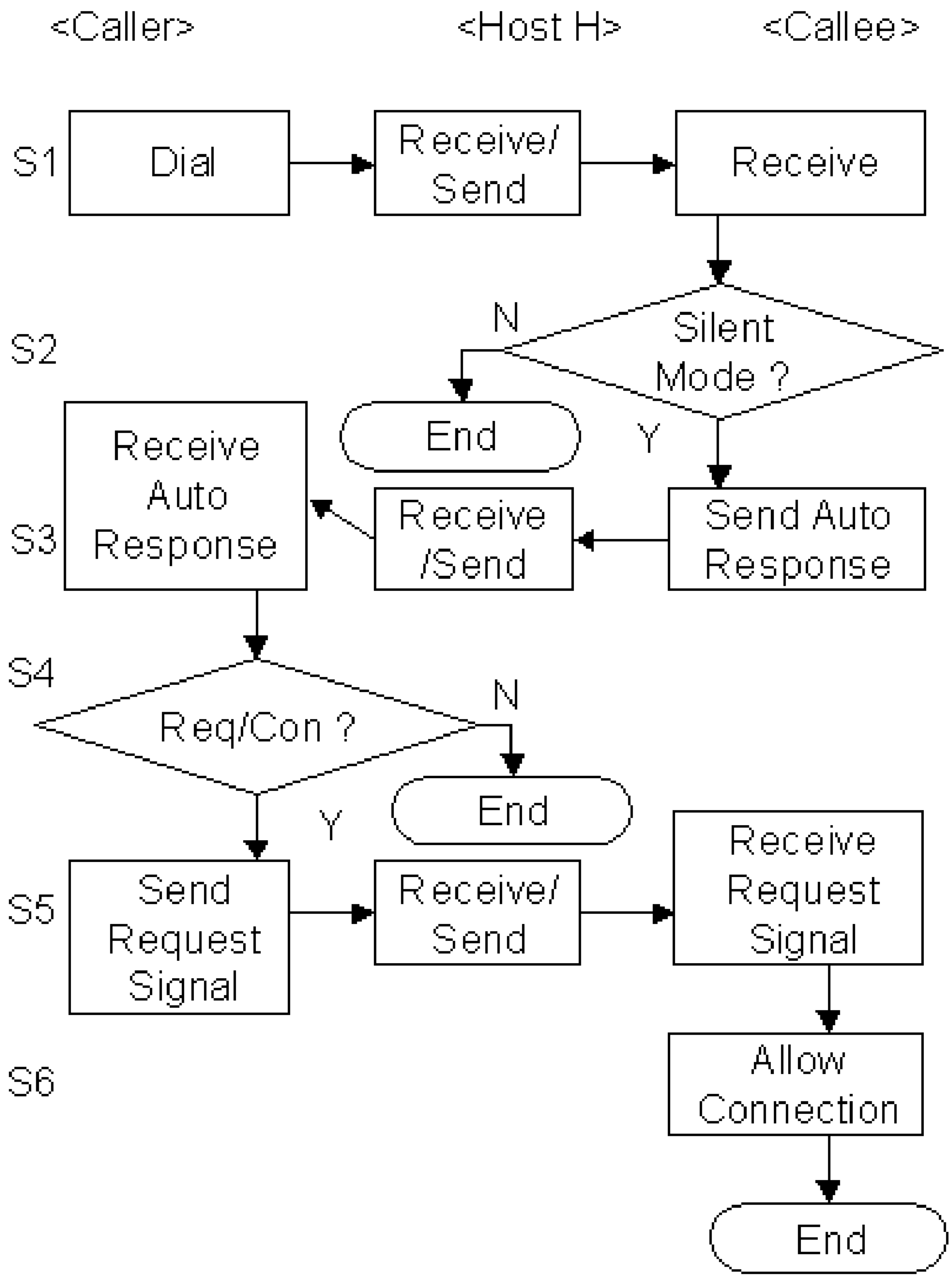
FIG. 32*e* is a flowchart illustrating an exemplary embodiment of the present invention.
Figure 32F:
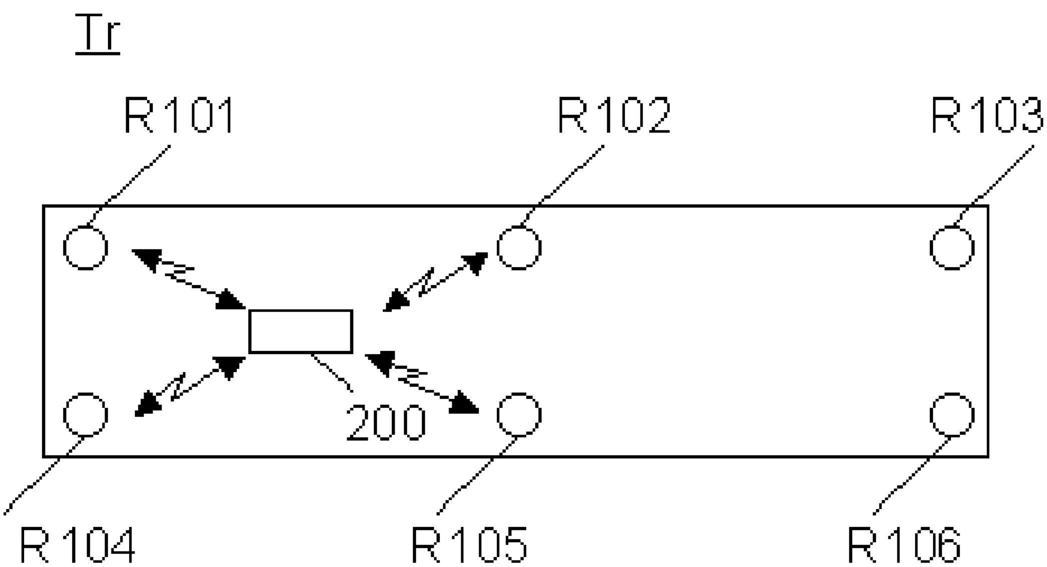
FIG. 32*f* is a simplified illustration illustrating an exemplary embodiment of the present invention.
Figure 32G:
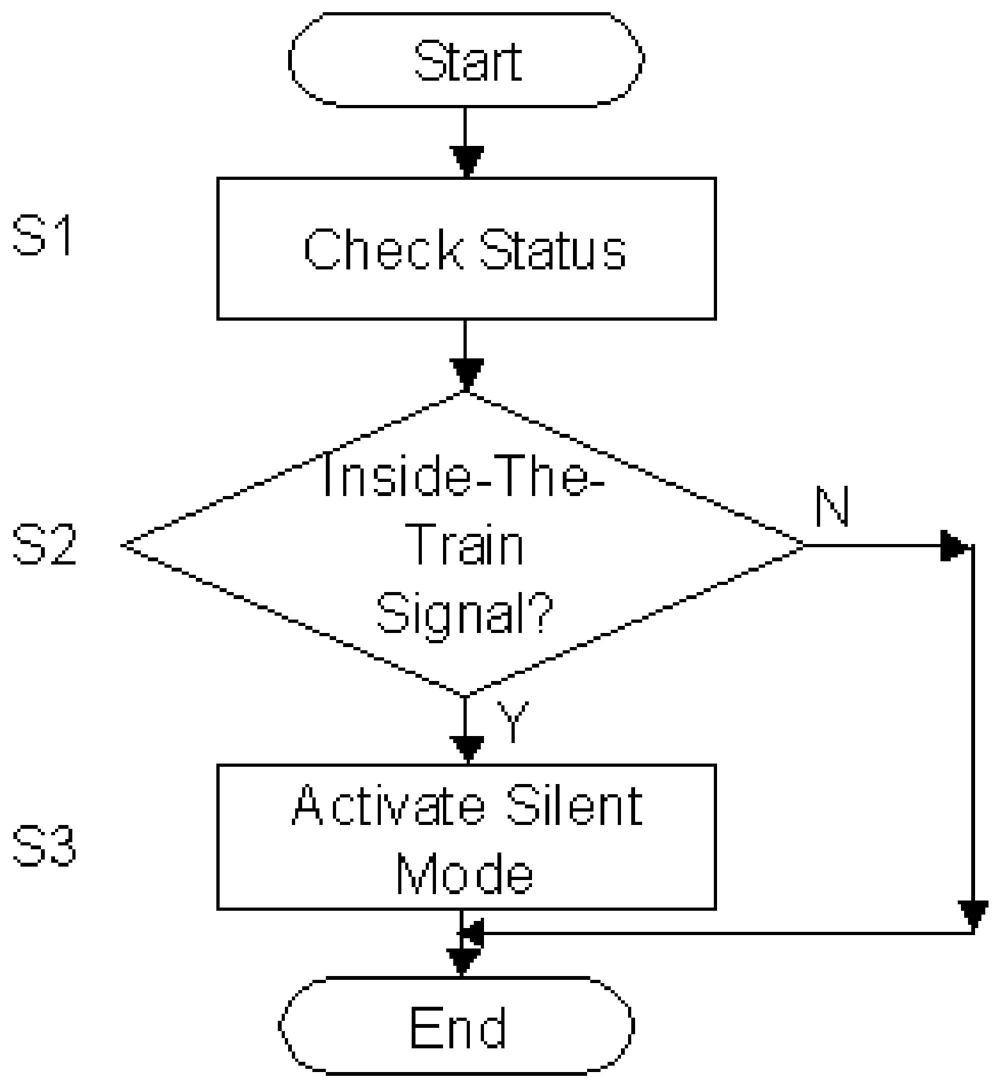
FIG. 32*g* is a flowchart illustrating an exemplary embodiment of the present invention.

Another embodiment is illustrated in FIGS. 32*f* and 32*g*. As illustrated in FIG. 32*f*, Relays R 101, R 102, R103, R 104, R 105, R 106, which perform the same function to the Relays described in FIG. 27*a* and FIG. 27*b*, are installed in Train Tr. The signals from these Relays are sent to Host H illustrated in FIG. 27*a*. Relays R 101 through R 106 emit inside-the-train signals which are emitted only inside Train Tr. FIG. 32*g* illustrates how Communication Device 200 operates inside Train Tr. Communication Device 200 periodically checks the signal received in Train Tr (S1). If Communication Device 200 determines that the signal received is an inside-the-train signal (S2), it activates the silent mode in the manner described above (S3).

<<Positioning System—Auto Response Mode>>

FIG. 32*d* and FIG. 32*e* illustrates the method to send an automatic response to a caller device when the silent mode is activated.

Assume that the caller device, a Communication Device 200, intends to call a callee device, another Communication Device 200 via Host H (FIG. 27*a*). As illustrated in FIG. 32*d*, the caller device dials the callee device and the dialing signal is sent to Host H (S1). Host H checks whether the callee device is in the silent mode (S2). If Host H detects that the callee device is in the silent mode, it sends a predetermined auto response which indicates that the callee is probably on a train and may currently not be available, which is received by the caller device (S3). If the user of the caller device still desires to request for connection and certain code is input from Input Device 210 (FIG. 1) or by the voice recognition system (S4), a request signal for connection is sent and received by Host H (S5), and the line is connected between the caller device and the callee device via Host H (S6).

As another embodiment of the present invention, the task of Host H (FIG. 27*a*) which is described in FIG. 32*d* may be delegated to the callee device as illustrated in FIG. 32*e*. The caller device dials the callee device and the dialing signal is sent to the callee device via Host H (S1). The callee device checks whether it is in the silent mode (S2). If the callee device detects that it is in the silent mode, it sends an predetermined auto response which indicates that the callee is probably on a train and may currently not be available, which is sent to the caller device via Host H (S3). If the user of the caller device still desires to request for connection and certain code is input from Input Device 210 (FIG. 1) or by the voice recognition system (S4), a request signal for connection is sent to the callee device via Host H (S5), and the line is connected between the caller device and the callee device via Host H (S6).

<<Positioning System—Summary>>

The foregoing inventions may be summarized as the following.

(1) A positioning system comprising a first device, a host, and a second device wherein a device ID of said second device is input into said first device, said device ID is sent to said host, said host sends a search signal to which said second device responds, said host sends to the first device location data indicating the location of said second device, and said first device displays the location of said second device thereby enabling said first device to identify the location of said second device. Where said first device is a communication device, said first device includes an antenna, said antenna sends positioning signal to identify the location of said second device, and said antenna also sends communication signal thereby enabling the user of said first device to identify the location of said second device as well as utilizing said communication device for means of communication.

(2) A communication device wherein the moving velocity of said communication device is checked and when said moving velocity exceeds a predetermined value said communication device refrains from emitting sound thereby preventing other persons being present near said communication device from being disturbed.

(3) A communication device wherein the location of said communication device is compared to a route data and said communication device refrains from emitting sound if said location of said communication device is determined to match said route data thereby preventing other persons being present near said communication device from being disturbed.

(4) A communication system comprising a first communication device and a second communication device wherein said first communication device receives an automatic response if said second communication device is in a certain mode and said first communication device is enable to be connected to said second communication device upon said second device sending a request thereby preventing other persons being present near said first communication device from being disturbed.

(5) A communication system comprising a communication device and a plurality of signal emitter wherein said communication device refrains from emitting sound upon receiving a certain signal from said signal emitter thereby preventing other persons being present near said communication device from being disturbed.

<<Auto Backup System>>

FIGS. 33 through 37 illustrate the automatic backup system of Communication Device 200 (FIG. 1).

Figure 33:
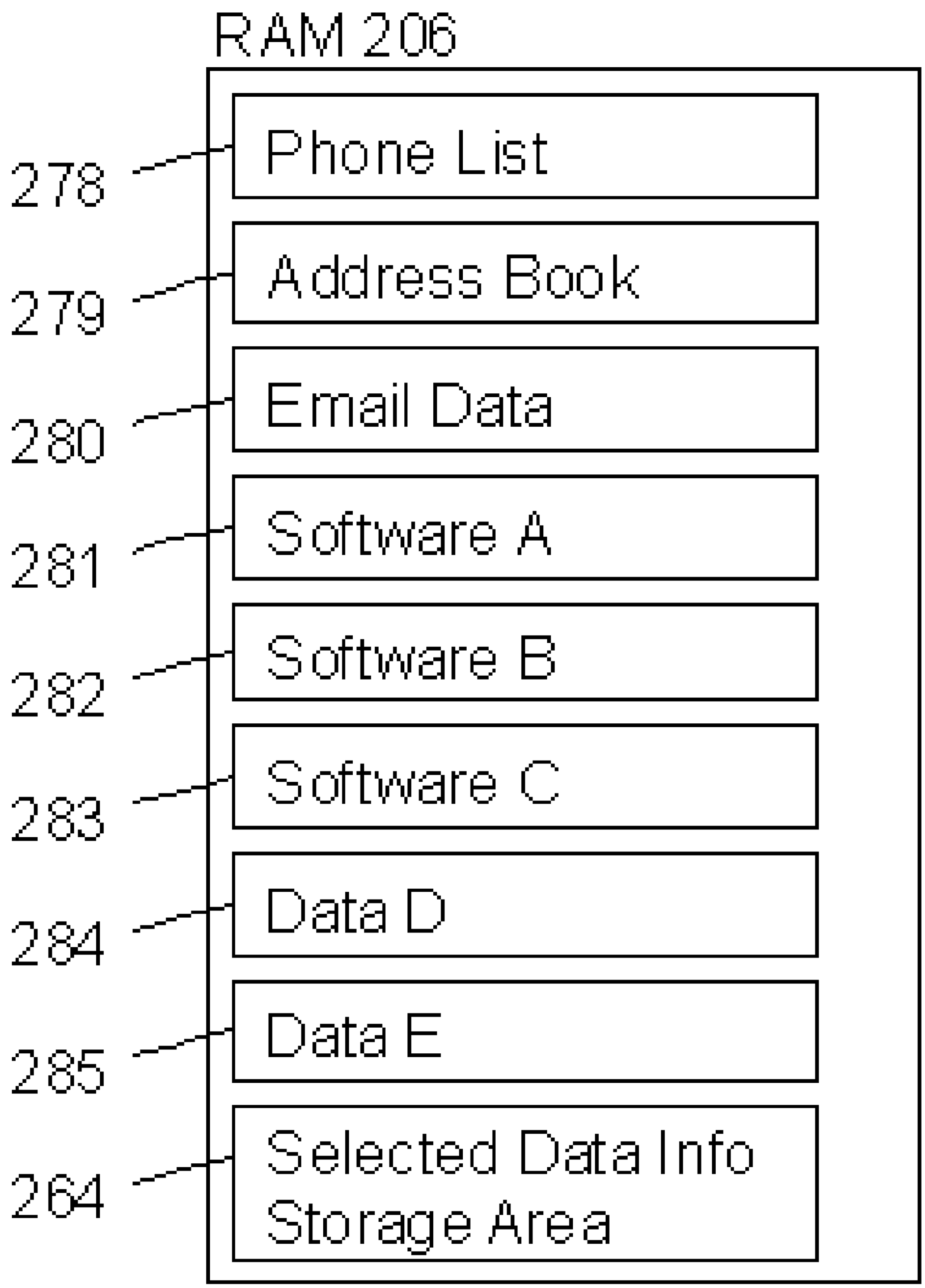
FIG. 33 is a block diagram illustrating an exemplary embodiment of the present invention.

As illustrated in FIG. 33, RAM 206 (FIG. 1) includes areas to store the data essential to the user of Communication Device 200, such as Area 278 for a phone list, Area 279 for an address book, Area 280 for email data, Area 281 for software A, Area 282 for software B, Area 283 for software C, Area 284 for Data D, Area 285 for Data E. RAM 206 also includes Area 264, i.e., the selected data info storage area, which will be explained in details hereinafter.

Figure 34:
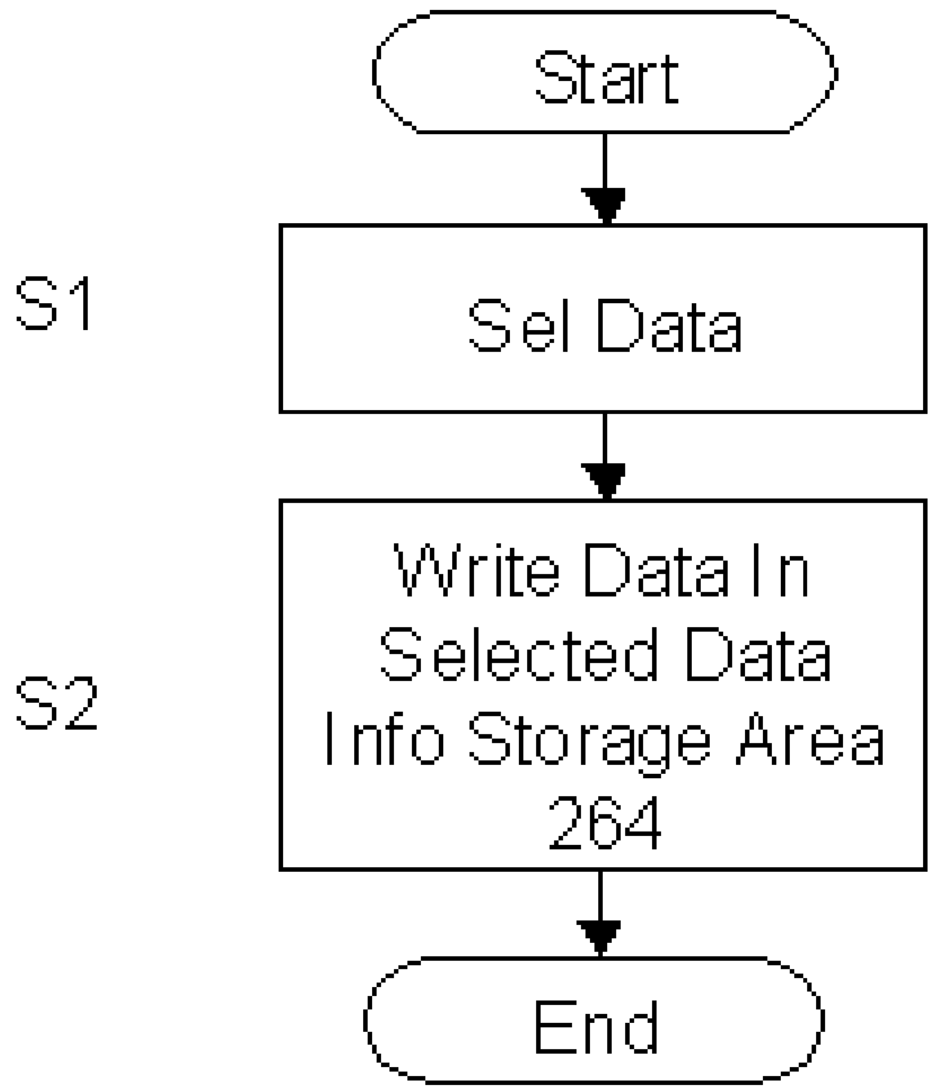
FIG. 34 is a flowchart illustrating an exemplary embodiment of the present invention.

As described in FIG. 34, the user selects data by utilizing Input Device 210 (FIG. 1) or the voice recognition system which he/she intends to be automatically backed up (S1). The selected data are written in Area 264, the selected data info storage area (S2).

Figure 35A:
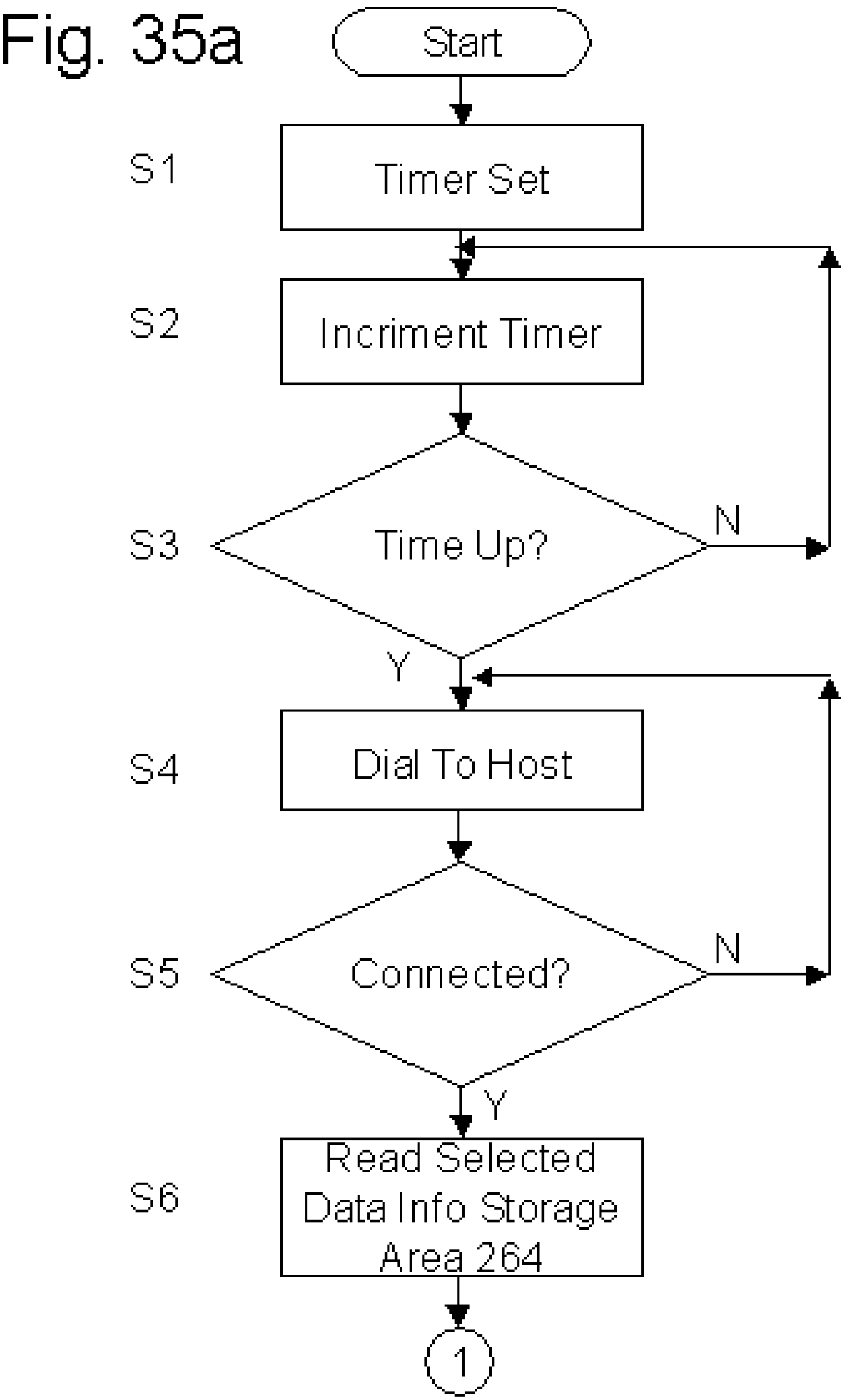
FIG. 35*a* is a flowchart illustrating an exemplary embodiment of the present invention.
Figure 35B:
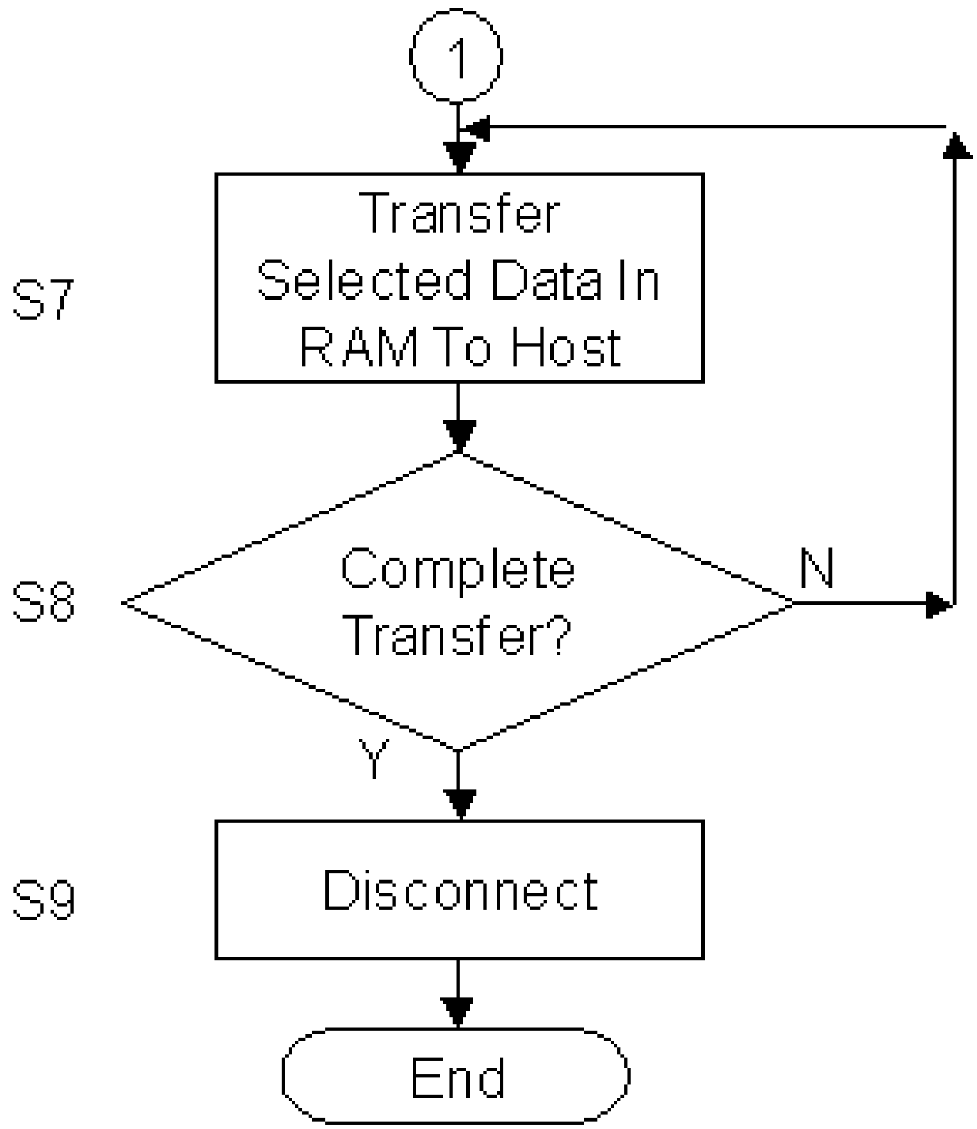
FIG. 35*b* is a flowchart illustrating an exemplary embodiment of the present invention.

The overall operation of this function is illustrated in FIGS. 35*a* and 35*b*. First of all, a timer (not shown) is set by a specific input signal produced by Input Device 210 (FIG. 1) or by the voice recognition system (S1). The timer is incremented periodically (S2) and when the incremented value equals the predetermined value (S3), CPU 211 (FIG. 1) initiates the dialing process (S4). The dialing process continues until Communication Device 200 is connected to Host H explained in FIG. 37 (S5). Once the line is connected, CPU 211 reads the information stored in Area 264 (S6) and based on such information it initiates to transfer the selected data from RAM 206 to Host H (S7). The transfer continues until all of the selected data are transferred to Host H (S8), and the line is disconnected thereafter (S9). This backup sequence can be initiated automatically and periodically by using a timer or manually. As another embodiment of the present invention, instead of selecting the data that are to be backed up, all data in RAM 206 (FIG. 1) can be transferred to Host H.

Figure 36:
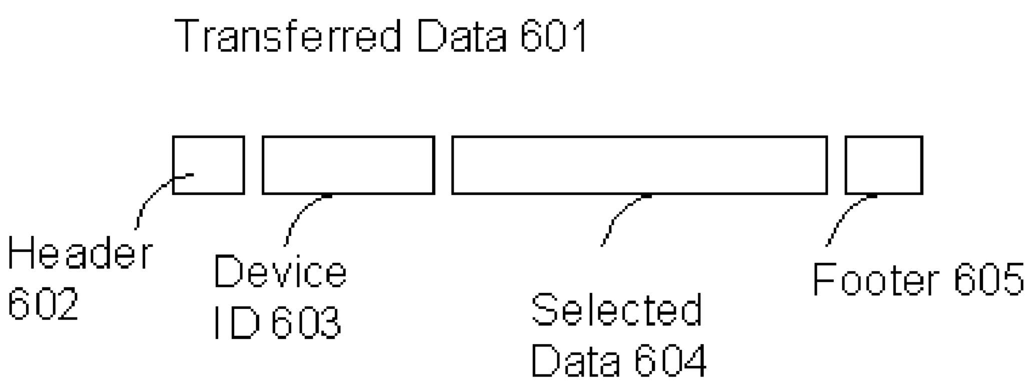
FIG. 36 is a simplified illustration illustrating an exemplary embodiment of the present invention.

FIG. 36 illustrates the basic structure of the data transferred to Host H. Transferred data 601 includes Header 602, device ID 603, selected data 604 and Footer 605. Device ID 603 is the identification number of Communication Device 200 preferably its phone number, and selected data 604 is a pack of data which is transferred from RAM 206 to Host H based on information stored in Area 264. Header 602 and Footer 605 indicates the beginning and the end of the Transferred Data 601 respectively.

Figure 37:
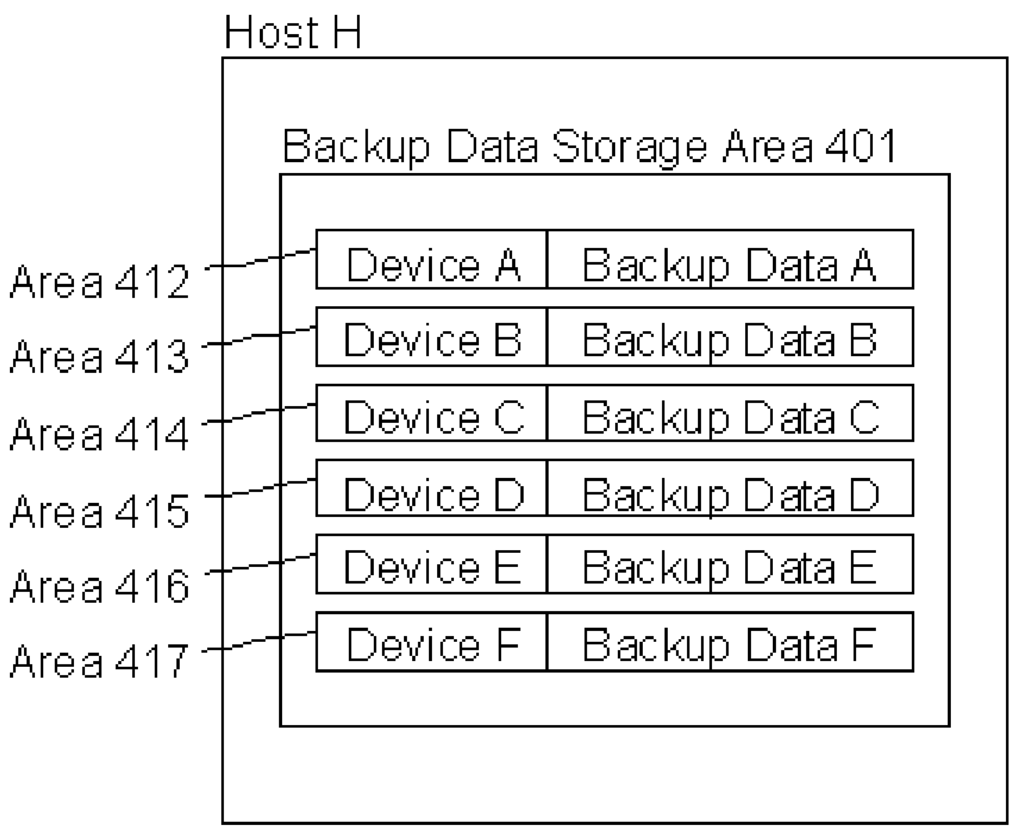
FIG. 37 is a block diagram illustrating an exemplary embodiment of the present invention.

FIG. 37 illustrates the basic structure of Host H. Host H includes backup data storage Area 401 which is used to backup all of the backup data transferred from all Communication Devices 200. Host H stores the Transferred Data 601 (FIG. 36) to the designated area based on the device ID included in Transferred Data 601. For example, Transferred Data 601 transferred from Device A is stored in Area 412 as Backup Data A. In the same manner Transferred Data 601 transferred from Device B is stored in Area 413 as Backup Data B; Transferred Data 601 transferred from Device C is stored in Area 414 as Backup Data C; Transferred Data 601 transferred from device D is stored in Area 415 as Backup Data D; Transferred Data 601 transferred from device E is stored in Area 416 as Backup Data E; and Transferred Data 601 transferred from device F is stored in Area 417 as Backup Data F.

<<Auto Backup—Summary>>

The foregoing invention may be summarized as the following.

A communication system comprising a host and a plurality of communication device wherein said host includes a plurality of storage areas and each of said plurality of communication device includes a storage area, and data stored in said storage area of said communication device are manually and/or periodically transferred to one of the designated storage areas of said host thereby enabling the users of said plurality of communication device to retrieve data when said plurality of communication device are lost or broken.

<<Signal Amplifier>>

Figure 38:
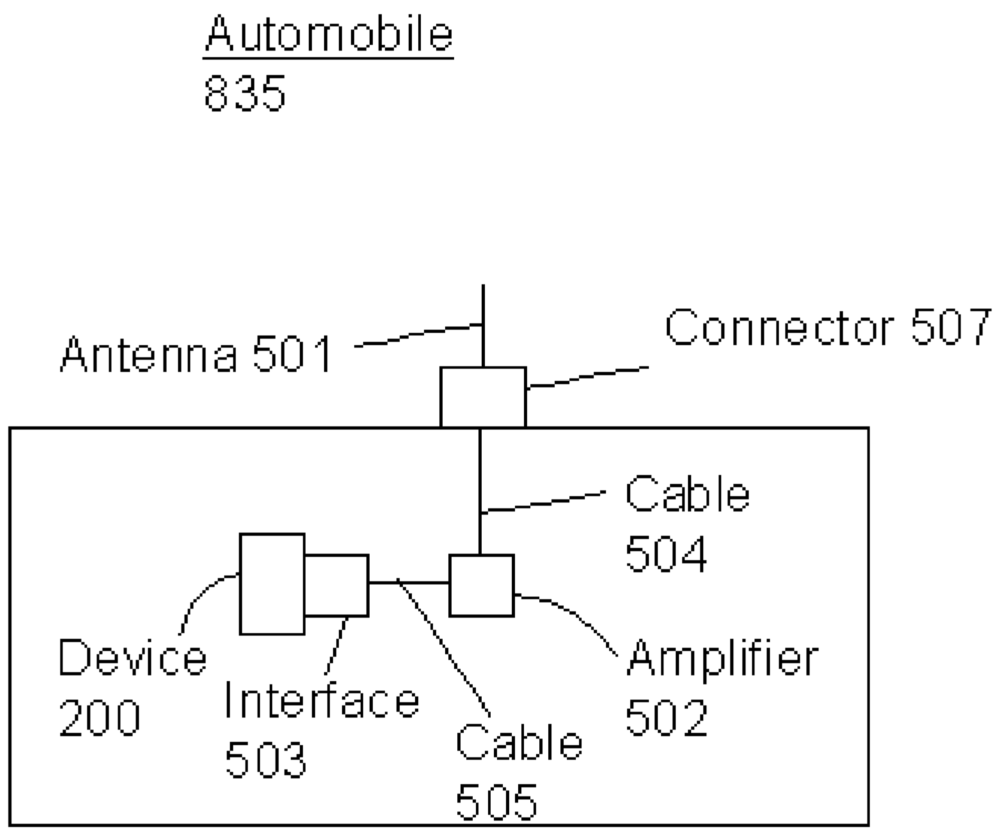
FIG. 38 is a simplified illustration illustrating an exemplary embodiment of the present invention.

FIG. 38 illustrates a signal amplifier utilized for automobiles and other transportation carriers, such as trains, airplanes, space shuttles, and motor cycles.

As described in FIG. 38, Automobile 835 includes Interface 503, an interface detachably connected to Communication Device 200, which is connected to Amplifier 502 via Cable 505. Amplifier 502 is connected to Antenna 501 via Cable 504 and Connector 507 as described in this drawing. The signal produced by Communication Device 200 is transferred to Interface 503. Then the signal is transferred to Amplifier 502 via Cable 505 where the signal is amplified. The amplified signal is transferred to Antenna 501 via Cable 504 and Connector 507, which transmits the amplified signal to Host H (not shown). The receiving signal is received by Antenna 501 and transferred to Amplifier 502 via Connector 507 and Cable 504, and then is transferred to Interface 503 via Cable 505, which transfers the amplified signal to Communication Device 200.

<<Signal Amplifier—Summary>>

The foregoing invention may be summarized as the following.

A transportation carrier which is primarily designed to carry person or persons comprising an interface which is detachably connectable to a communication device, an amplifier which is connected to said interface and which amplifies the signal produced by said communication device, and an transmitter which is connected to said amplifier and which transmits said signal amplified by said amplifier.

<<Audio/Video Data Capturing System>>

FIGS. 39 through 44 illustrate the audio/video capturing system of Communication Device 200 (FIG. 1).

Assuming that Device A, a Communication Device 200, captures audio/video data and transfers such data to Device B, another Communication Device 200, via a host (not shown). Primarily video data is input from CCD Unit 214 (FIG. 1) and audio data is input from Microphone 215 of (FIG. 1) of Device A.

Figure 39:
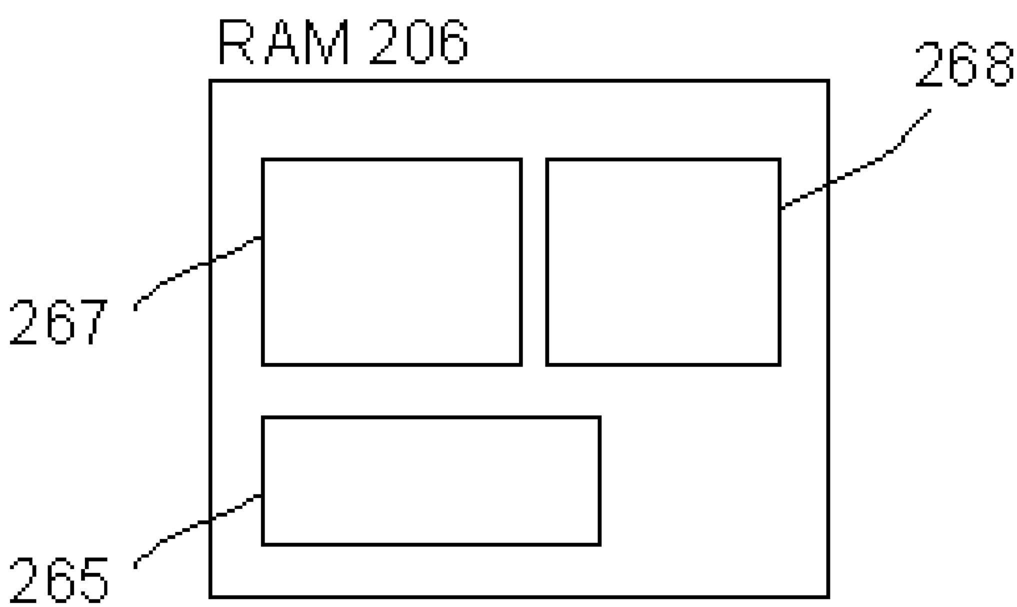
FIG. 39 is a block diagram illustrating an exemplary embodiment of the present invention.

As illustrated in FIG. 39, RAM 206 (FIG. 1) includes Area 267 which stores video data, Area 268 which stores audio data, and Area 265 which is a work area utilized for the process explained hereinafter.

Figure 40:
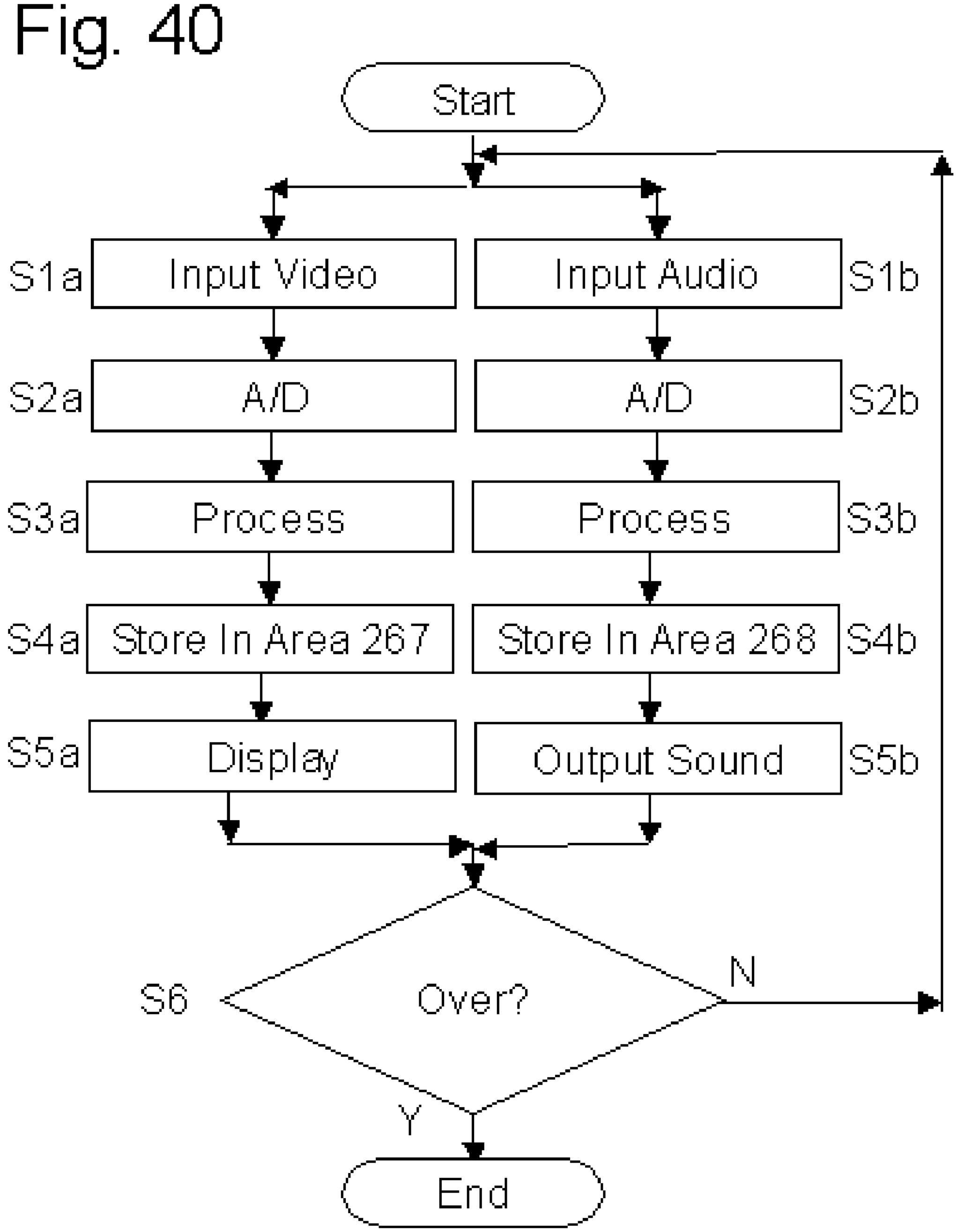
FIG. 40 is a flowchart illustrating an exemplary embodiment of the present invention.

As described in FIG. 40, the video data input from CCD Unit 214 (FIG. 1) (S1*a*) is converted from analog data to digital data (S2*a*) and is processed by Video Processor 202 (FIG. 1) (S3*a*). Area 265 (FIG. 39) is used as work area for such process. The processed video data is stored in Area 267 (FIG. 39) of RAM 206 (S4*a*) and is displayed on LCD 201 (FIG. 1) (S5*a*). As described in the same drawing, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). Area 265 is used as work area for such process. The processed audio data is stored in Area 268 (FIG. 39) of RAM 206 (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

Figure 41:
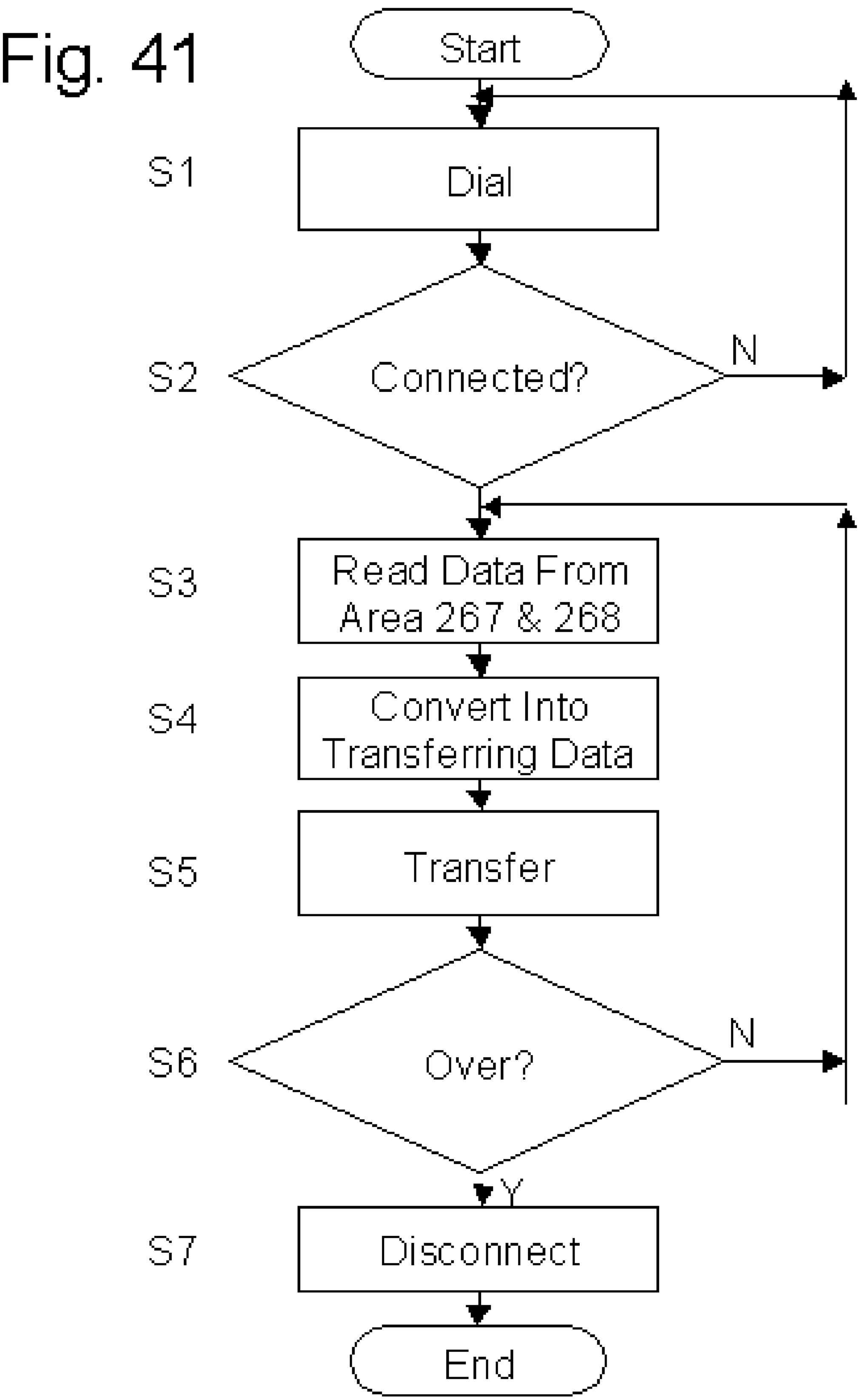
FIG. 41 is a flowchart illustrating an exemplary embodiment of the present invention.

FIG. 41 illustrates the sequence to transfer the video data and the audio data via Antenna 218 (FIG. 1) in a wireless fashion. As described in FIG. 41, CPU 211 (FIG. 1) of Device A initiates a dialing process (S1) until the line is connected to a host (not shown) (S2). As soon as the line is connected, CPU 211 reads the video data and the audio data stored in Area 267 (FIG. 39) and Area 268 (FIG. 39) (S3) and transfer them to Signal Processor 208 (FIG. 1) where the data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

Figure 42:
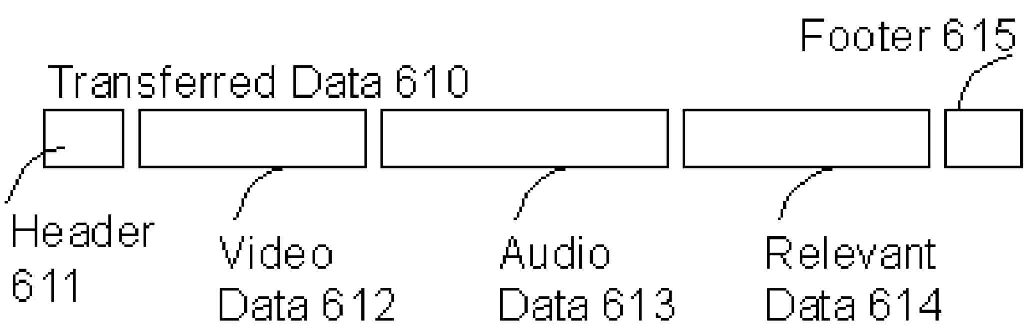
FIG. 42 is a simplified illustration illustrating an exemplary embodiment of the present invention.

FIG. 42 illustrates the basic structure of the transferred data which is transferred from Device A as described in S4 and S5 of FIG. 41. Transferred data 610 is primarily composed of Header 611, video data 612, audio data 613, relevant data 614, and Footer 615. Video data 612 corresponds to the video data stored in Area 267 (FIG. 39) of RAM 206, and audio data 613 corresponds to the audio data stored in Area 268 (FIG. 39) of RAM 206. Relevant Data 614 includes various types of data, such as the identification numbers of Device A (i.e., transferor device) and Device B (i.e., the transferee device), a location data which represents the location of Device A, email data transferred from Device A to Device B, etc. Header 611 and Footer 615 represent the beginning and the end of Transferred Data 610 respectively.

Figure 43:
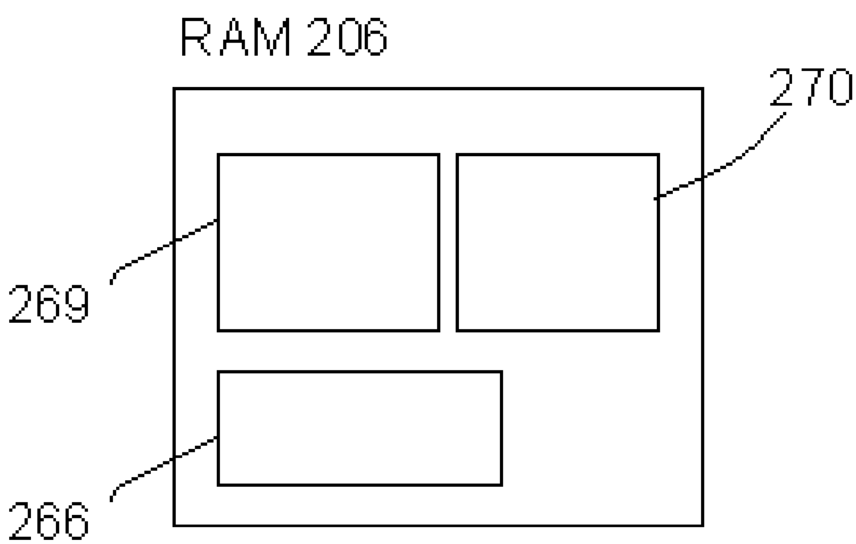
FIG. 43 is a block diagram illustrating an exemplary embodiment of the present invention.

FIG. 43 illustrates the data contained in RAM 206 (FIG. 1) of Device B. As illustrated in FIG. 43, RAM 206 includes Area 269 which stores video data, Area 270 which stores audio data, and Area 266 which is a work area utilized for the process explained hereinafter.

Figure 44A:
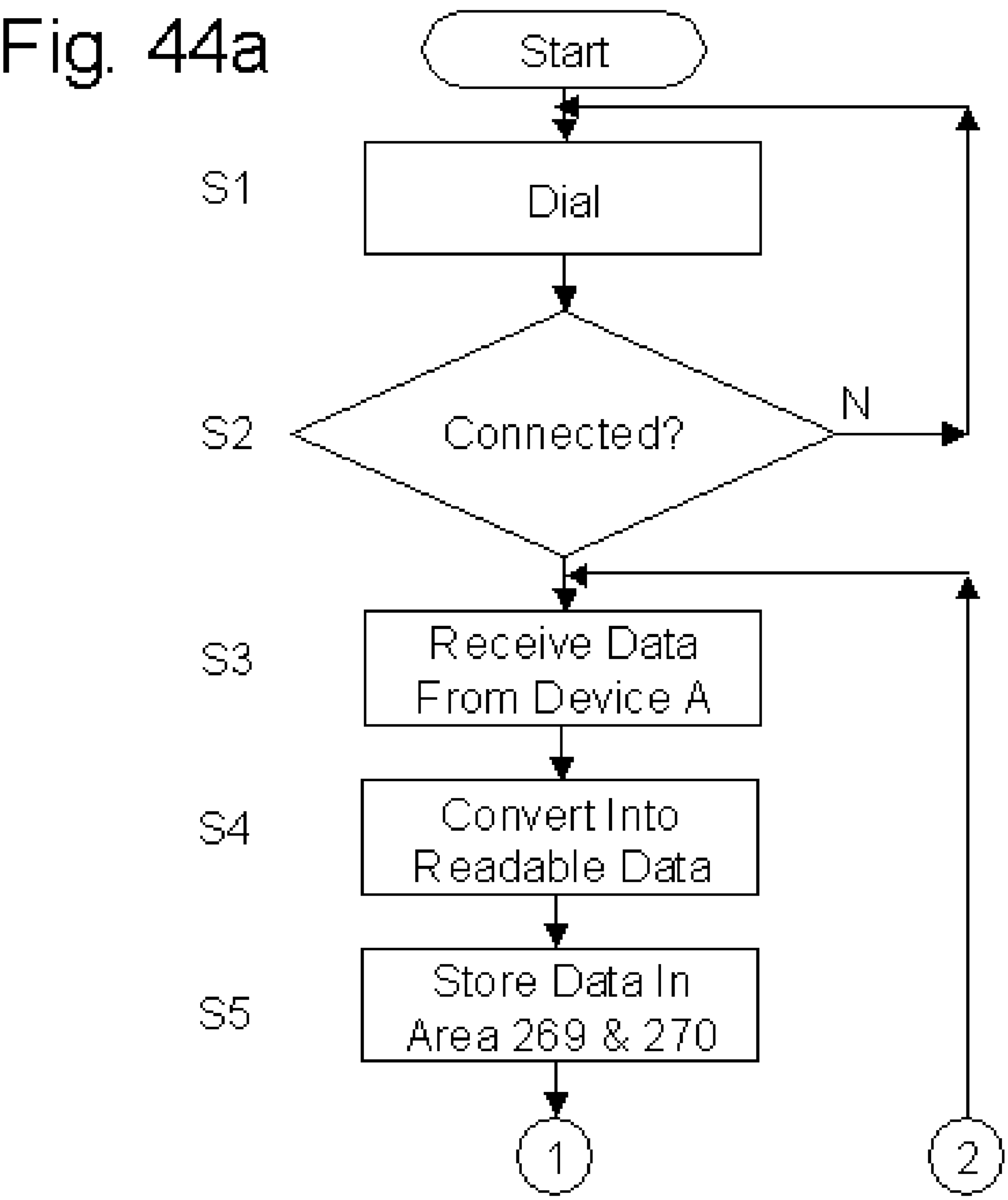
FIG. 44*a* is a flowchart illustrating an exemplary embodiment of the present invention.
Figure 44B:
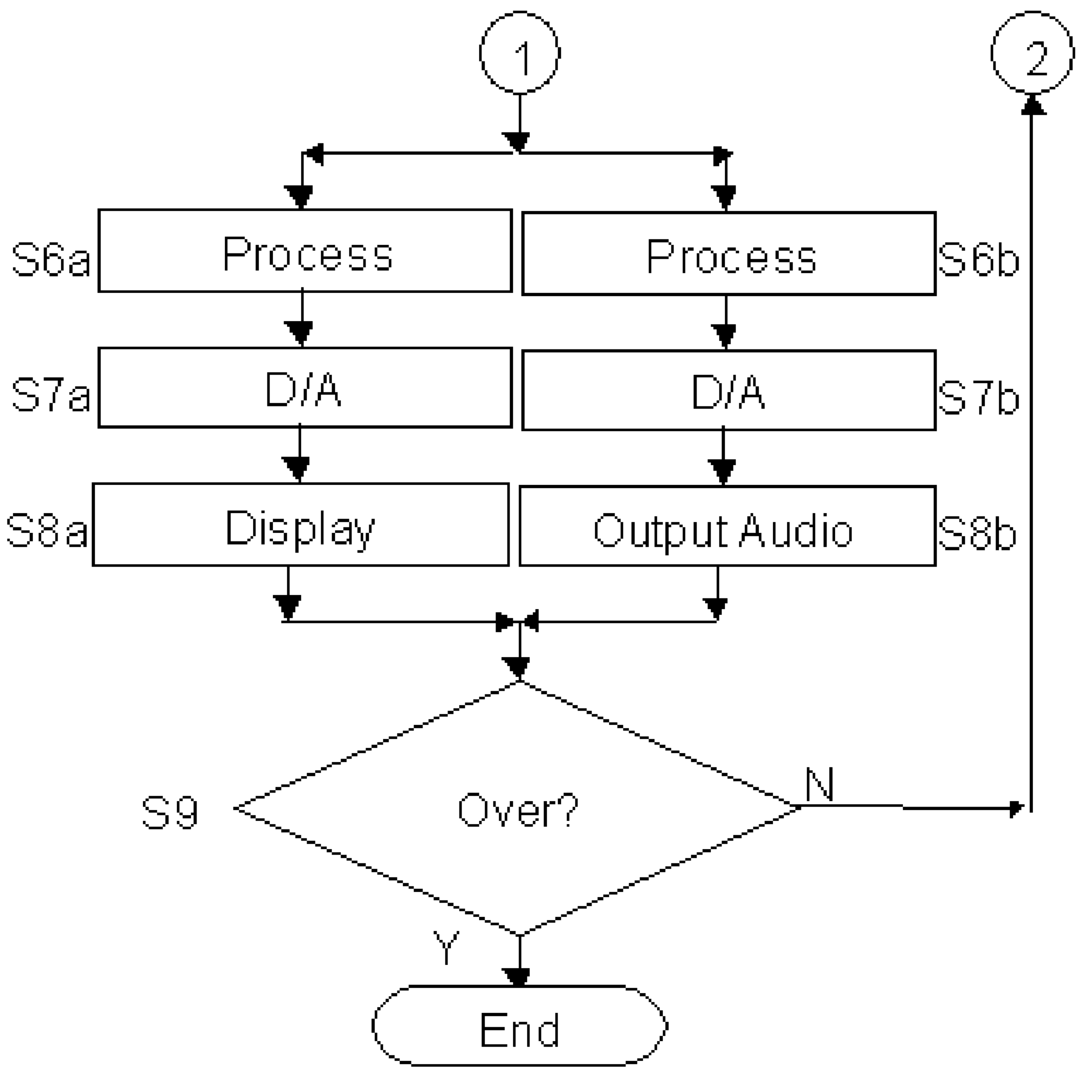
FIG. 44*b* is a flowchart illustrating an exemplary embodiment of the present invention.

As described in FIG. 44*a* and FIG. 44*b*, CPU 211 (FIG. 1) of Device B initiates a dialing process (S1) until Device B is connected to a host (not shown) (S2). Transferred Data 610 is received by Antenna 218 (FIG. 1) of Device B (S3) and is converted by Signal Processor 208 (FIG. 1) into data readable by CPU 211 (S4). Video data and audio data are retrieved from Transferred Data 610 and stored into Area 269 (FIG. 43) and Area 270 (FIG. 43) of RAM 206 respectively (S5). The video data stored in Area 269 is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270 is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input from Input Device 210 (FIG. 1) or via the voice recognition system (S9).

<<Audio/Video Data Capturing System—Summary>>

The foregoing invention may be summarized as the following.

(1) A communication system comprising a first communication device and a second communication device wherein said first communication consists of a video input means to input video information, a microphone, and a first antenna, said second communication device consists of a display means to output said video information, a speaker, and a second antenna, said first communication device inputs said video information and said audio information from said video input means and said microphone respectively, said video information and said audio information are sent to said second communication device from said first antenna in a wireless fashion, said second communication device receives said video information and said audio information in a wireless fashion from said second antenna, and said video information and said audio information are output from said display means and said speaker of said second communication device respectively thereby enabling the user of said first communication device and the user of said second communication device to communicate at any location wherever they desire.

(2) A communication device comprising a video input means to input video information, a microphone, and an antenna wherein said communication device inputs said video information and said audio information from said video input means and said microphone respectively, said video information is sent to another device in a wireless fashion from said antenna, said audio information is also sent to said other device in a wireless fashion from said antenna thereby enabling the user of said communication device to communicate with said other device by utilizing said video information and said audio information in any location wherever he/she desires.

<<Digital Mirror Function (1)>>

Figure 44C:
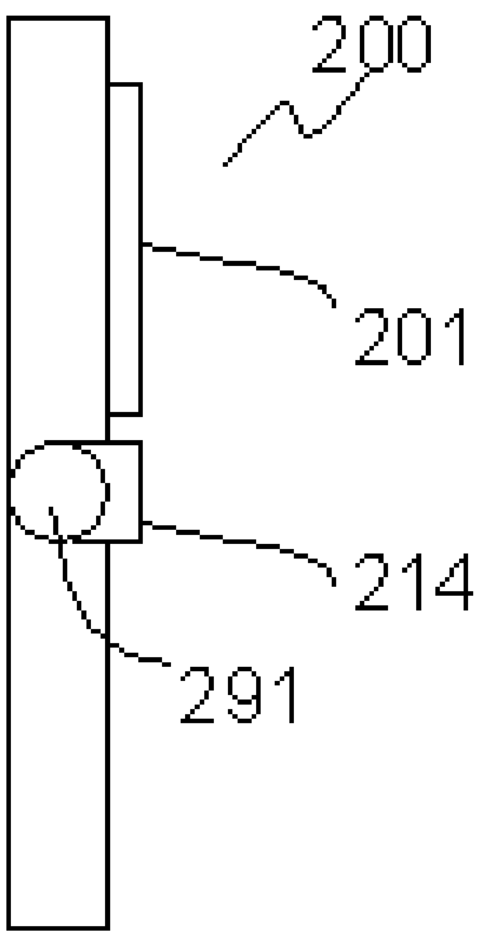
FIG. 44*c* is a simplified illustration illustrating an exemplary embodiment of the present invention.
Figure 44D:
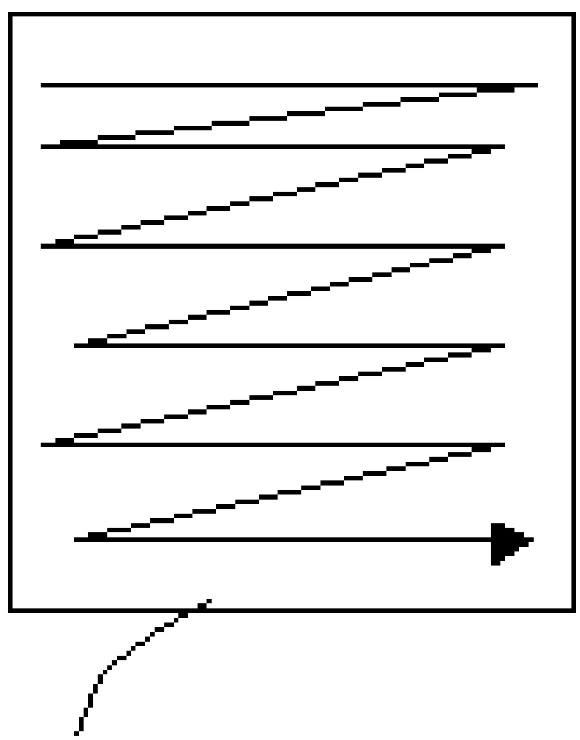
FIG. 44*d* is a simplified illustration illustrating an exemplary embodiment of the present invention.
Figure 44E:
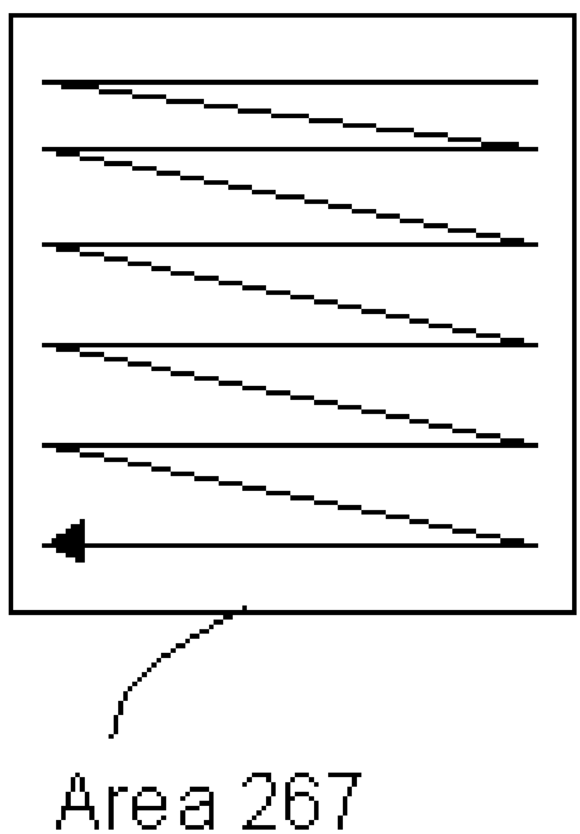
FIG. 44*e* is a simplified illustration illustrating an exemplary embodiment of the present invention.

FIGS. 44*c* through 44*e* illustrate the first embodiment of digital mirror function of Communication Device 200 (FIG. 1).

In this embodiment, Communication Device 200 includes Rotator 291 as described in FIG. 44*c*. Rotator 291 is fixed to the side of Communication Device 200 and rotates CCD Unit 214 (FIG. 1) and thereby CCD Unit 214 is enabled to face multi-direction. CPU 211 (FIG. 1) reads the video data stored in Area 267 (FIG. 39) from left to right as described in FIG. 44*d* when CCD Unit 214 is facing the opposite direction from LCD 201 (FIG. 1). However, when CCD Unit 214 is facing the same direction with LCD 201, CPU 211 reads the video data stored in Area 267 from right to left as described in FIG. 44*e* thereby producing a 'mirror image' on LCD 201. As another embodiment, more than one area in RAM 206 (FIG. 1) may be utilized instead of one area, i.e., Area 267. The following description is not explained in the drawing figures. First Area and Second Area in RAM 206 (FIG. 1) are utilized in this embodiment. First of all, CPU 211 stores the video data taken from CCD Unit 214 into both First Area and Second Area. Here, the video data stored in First Area and Second Area are identical. CPU 211 reads the video data stored in First Area from left to right as described in FIG. 44*d*. CPU 211 reads the video data stored in Second Area from right to left as described in FIG. 44*e*. CPU 211 displays the video data stored in First Area on LCD 201 when CCD Unit 214 is facing the opposite direction from LCD 201. CPU 211 displays the video data stored in Second Area on LCD 201 when CCD Unit 214 is facing the same direction with LCD 201.

As another embodiment of the present invention, more than one CCD unit which face multi-direction may be utilized instead of enabling one CCD unit to rotate in the manner described hereinbefore. The following description is not explained in the drawing figures. First CCD Unit and Second CCD Unit are utilized in this embodiment. Here, First CCD Unit faces the opposite direction from LCD 201 (FIG. 1), and Second CCD Unit faces the same direction with LCD 201. CPU 211 (FIG. 1) reads the video data stored in Area 267 (FIG. 39) from left to right as described in FIG. 44*d* when First CCD Unit is activated. CPU 211 reads the video data stored in Area 267 (FIG. 39) from right to left as described in FIG. 44*e* when Second CCD Unit is activated thereby producing a 'mirror image' on LCD 201. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267. First Area and Second Area in RAM 206 are utilized in this embodiment. Here, First Area is designed to be read from left to right as described in FIG. 44*d*, and Second Area is designed to be read from right to left as described in FIG. 44*e*. CPU 211 stores the video data taken from First CCD Unit and Second CCD Unit into First Area and Second Area respectively. CPU 211 displays the video data stored in First Area on LCD 201 when First CCD Unit is activated, and also displays the video data stored in Second Area on LCD 201 when Second CCD Unit is activated.

As another embodiment of the present invention, more than one LCD unit which face multi-direction may be utilized instead of one LCD 201 (FIG. 1). The following description is not explained in the drawing figures. First LCD and Second LCD are utilized in this embodiment. Here, First LCD faces the opposite direction from CCD Unit 214 (FIG. 1), and Second LCD faces the same direction with CCD Unit 214. CPU 211 (FIG. 1) reads the video data stored in Area 267 (FIG. 39) from left to right as described in FIG. 44*d* when First LCD is activated. CPU 211 (FIG. 1) reads the video data stored in Area 267 (FIG. 39) from right to left as described in FIG. 44*e* when Second LCD is activated thereby producing a 'mirror image' thereon. Such activations may be rendered automatically by CPU 211 or manually by the user of Communication Device 200 utilizing input device 210 (FIG. 1) or via voice recognition system. As another embodiment, more than one area in RAM 206 (FIG. 1) may be utilized instead of one area, i.e., Area 267 (FIG. 39). First Area and Second Area in RAM 206 (FIG. 1) are utilized in this embodiment. CPU 211 stores the video data taken from CCD Unit 214 into both First Area and Second Area. Here, the video data stored in First Area and Second Area are identical. CPU 211 reads the video data stored in First Area from left to right as described in FIG. 44*d*, and also reads the video data stored in Second Area from right to left as described in FIG. 44*e*. The video data stored in First Area is displayed on First LCD, and the video data stored in Second Area is displayed on Second LCD.

<<Digital Mirror—Summary>>

The foregoing inventions may be summarized as the following.

(1) A wireless communication device comprising a camera, a display, an image data producing means, a wireless transmitting means, wherein said camera is capable of facing a first direction and a second direction, said image data producing means is capable of producing a non-inverted image data and an inverted image data, said image data producing means produces said non-inverted image data which is displayed on said display when said camera is facing said first direction and produces said inverted image data which is displayed on said display when said camera is facing said second direction, while said non-inverted image data is transferred in a wireless fashion from said wireless transmitting means.

(2) A communication device comprising a display and a video input means wherein said display outputs video image which is input from said video input means and said video image is output in a symmetric fashion when said video input means is facing the same direction with said display thereby enabling the user of said communication device to utilize said communication device as a digital mirror.

<<Caller ID System>>

Figure 46:
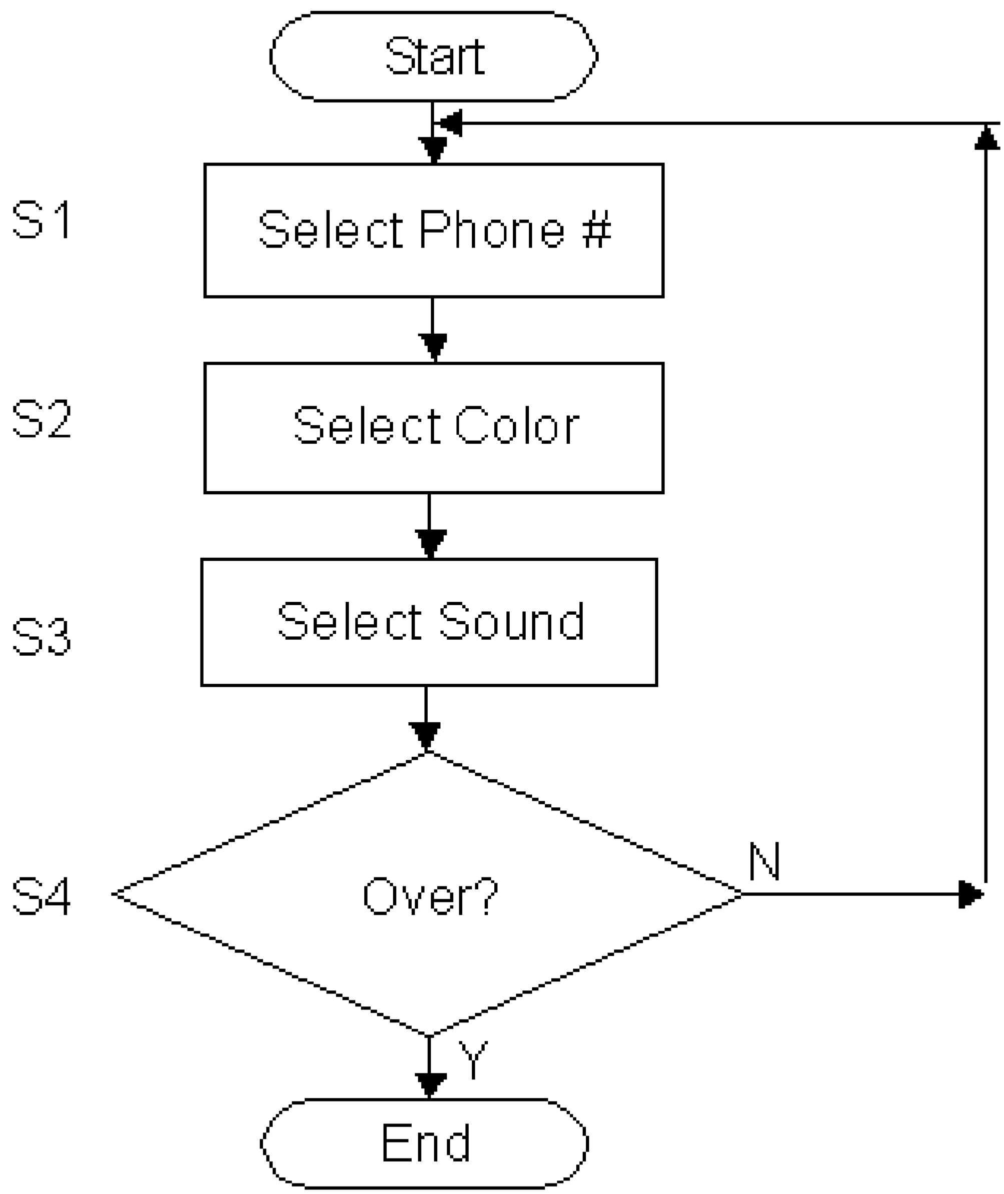
FIG. 46 is a flowchart illustrating an exemplary embodiment of the present invention.
Figure 47:
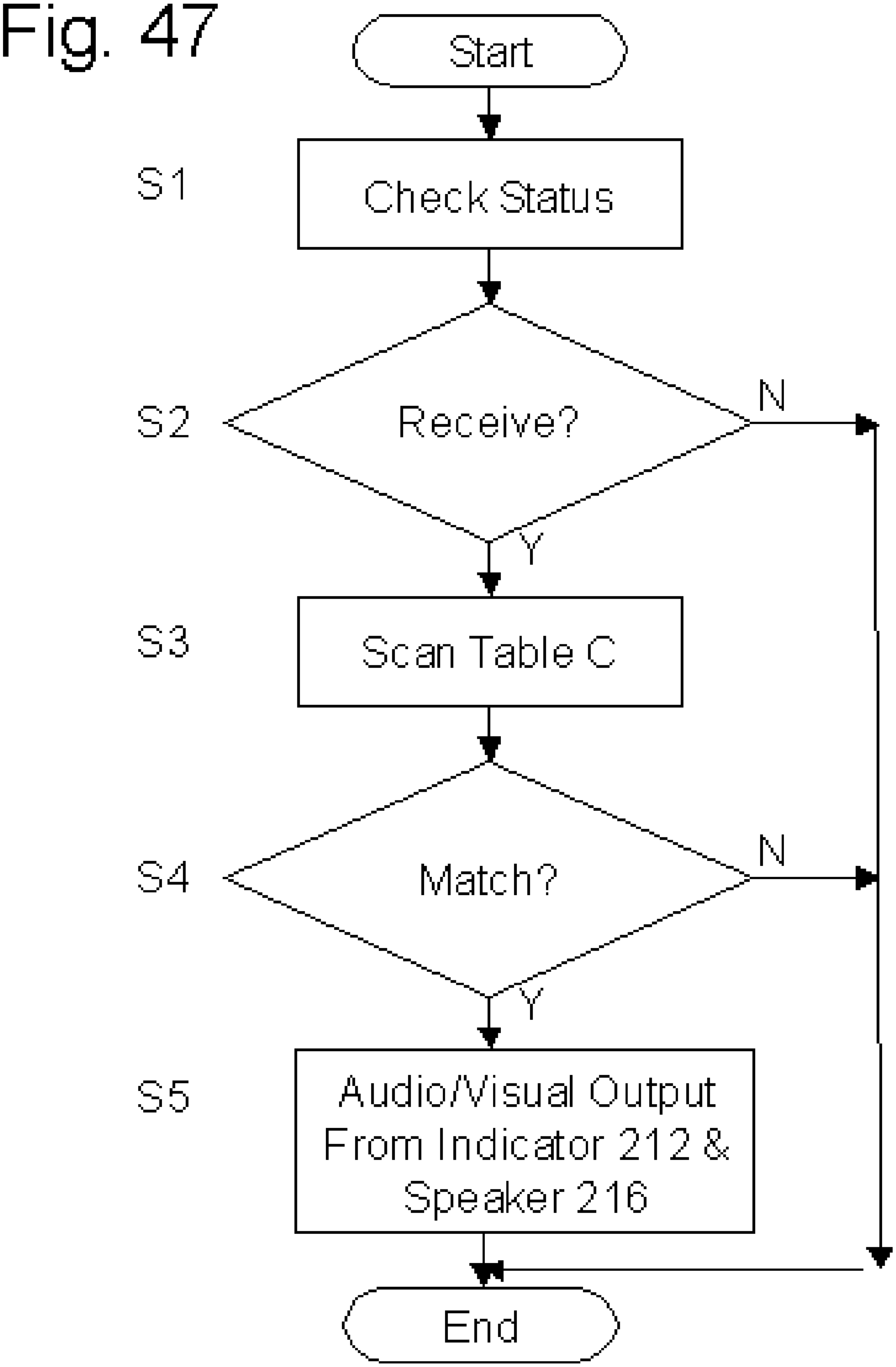
FIG. 47 is a flowchart illustrating an exemplary embodiment of the present invention.

FIGS. 45 through 47 illustrate the caller ID system of Communication Device 200 (FIG. 1).

As illustrated in FIG. 45, RAM 206 includes Table C. As shown in the drawing, each phone number corresponds to a specific color and sound. For example Phone #1 corresponds to Color A and Sound E; Phone #2 corresponds to Color B and Sound F; Phone #3 corresponds to Color C and Sound G; and Phone #4 corresponds to color D and Sound H.

As illustrated in FIG. 46, the user of Communication Device 200 selects or inputs a phone number (S1) and selects a specific color (S2) and a specific sound (S3) designated for that phone number by utilizing Input Device 210 (FIG. 1). Such sequence can be repeated until there is a specific input signal from Input Device 210 ordering to do otherwise (S4).

As illustrated in FIG. 47, CPU 211 (FIG. 1) periodically checks whether it has received a call from other communication devices (S1). If it receives a call (S2), CPU 211 scans Table C (FIG. 45) to see whether the phone number of the caller device is registered in the table (S3). If there is a match (S4), the designated color is output from Indicator 212 (FIG. 1) and the designated sound is output from Speaker 216 (FIG.

1) (S5). For example if the incoming call is from Phone #1, Color A is output from Indicator 212 and Sound E is output from Speaker 216.

<<Caller ID—Summary>>

The foregoing invention may be summarized as the following.

A communication device comprising a color emitting means which outputs more than one type of color and a speaker which outputs more than one audio information wherein said communication device stores information regarding a plurality of phone numbers, a specific color and/or a specific audio information is designated to each phone number respectively, and said specific color is output from said color emitting means and/or said specific audio information is output from said speaker according to the phone number of an incoming call thereby enabling the user of said communication device to perceive the identification of the caller of said incoming call in advance of answering thereto.

<<Stock Purchasing Function>>

FIGS. 48 through 52 illustrate the method of purchasing stocks by utilizing Communication Device 200 (FIG. 1).

Figure 48:
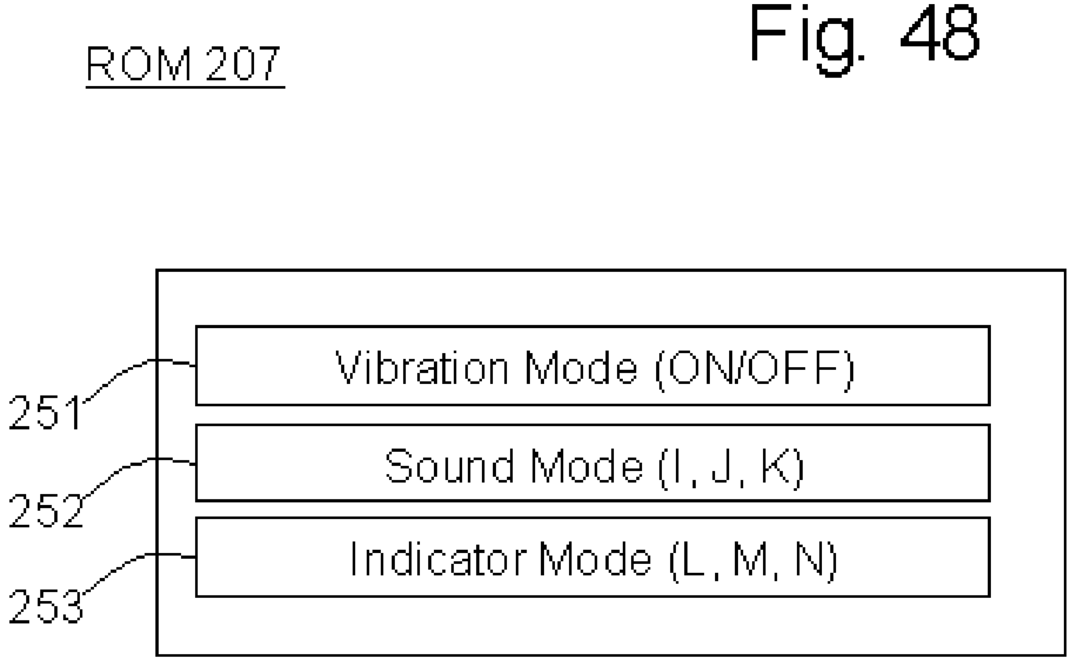
FIG. 48 is a block diagram illustrating an exemplary embodiment of the present invention.

FIG. 48 illustrates the data stored in ROM 207 (FIG. 1) necessary to set the notice mode. Area 251 stores the program regarding the vibration mode (i.e., vibration mode ON/vibration mode OFF); Area 252 stores the program regarding sound which is emitted from Speaker 216 (FIG. 1) and several types of sound data, such as Sound Data I, Sound Data J, and Sound Data K are stored therein; Area 253 stores the program regarding the color emitted from Indicator 212 (FIG. 1) and several types of color data, such as Color Data L, Color Data M, and Color Data N are stored therein.

Figure 49:
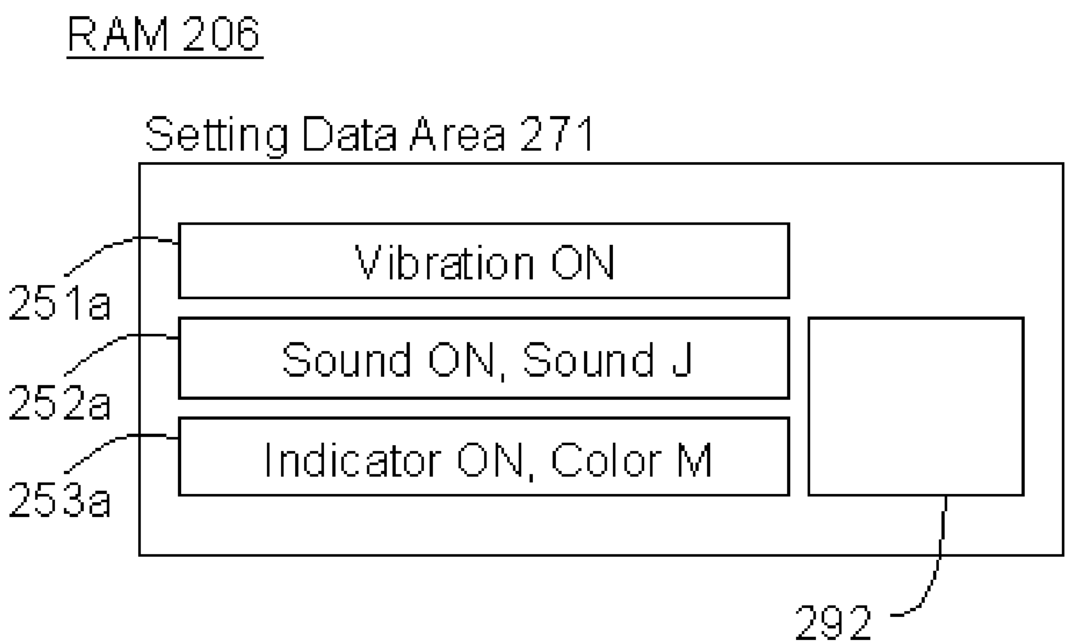
FIG. 49 is a block diagram illustrating an exemplary embodiment of the present invention.

As illustrated in FIG. 49, the notice mode is activated in the manner in compliance with the settings stored in setting data Area 271 of RAM 206 (FIG. 1). In the example illustrated in FIG. 49, when the notice mode is activated, Vibrator 217 (FIG. 1) is turned on in compliance with the data stored in Area 251*a*, Speaker 216 (FIG. 1) is turned on and Sound Data J is emitted therefrom in compliance with the data stored in Area 252*a*, and Indicator 212 (FIG. 1) is turned on and Color M is emitted therefrom in compliance with the data stored in Area 253*a*. Area 292 stores the stock purchase data, i.e., the name of the brand, the amount of limited price, the name of the stock market (such as NASDAQ and/or NYSE) and other relevant information regarding the stock purchase.

Figure 50:
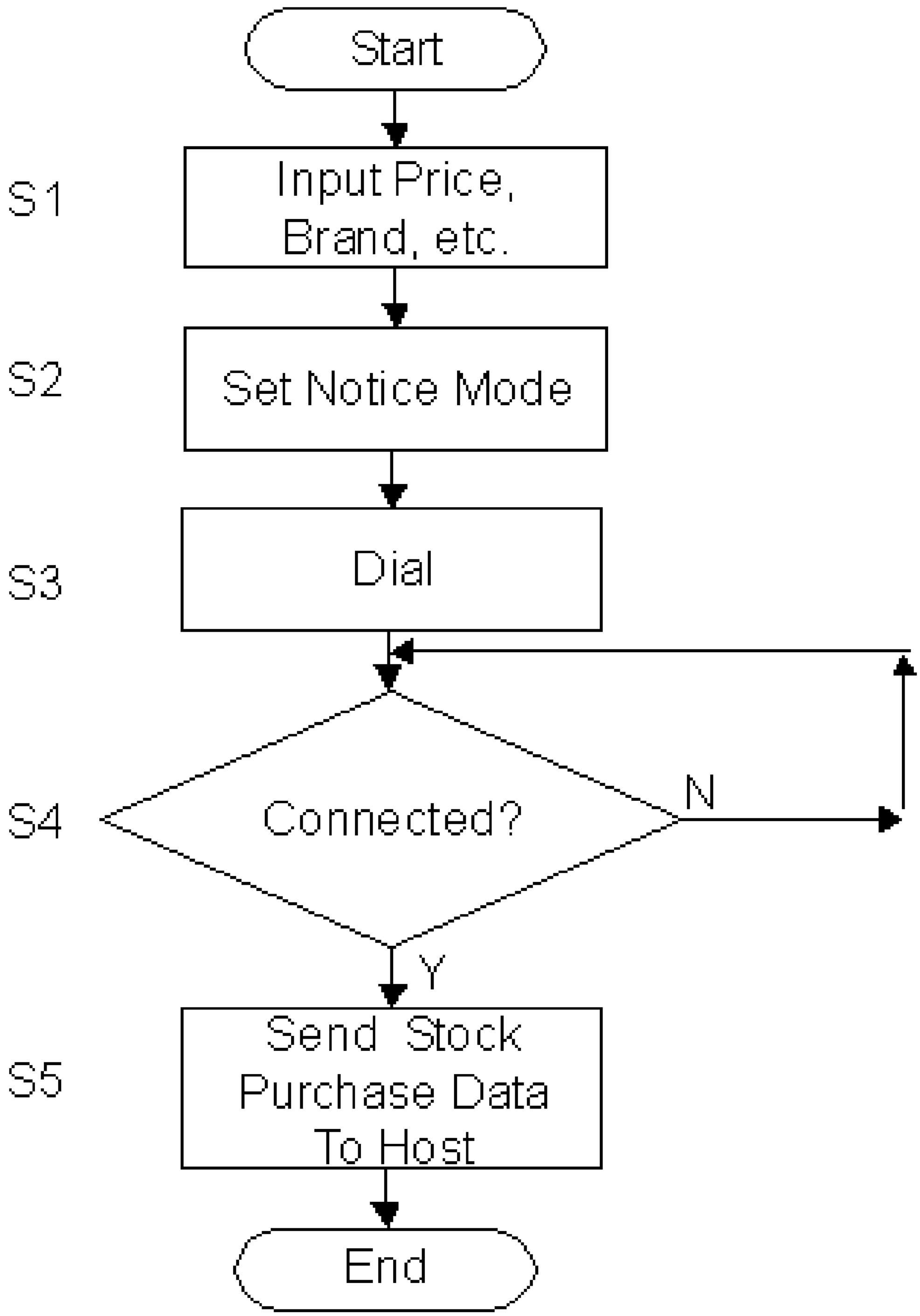
FIG. 50 is a flowchart illustrating an exemplary embodiment of the present invention.

As illustrated in FIG. 50, the user of Communication Device 200 inputs the stock purchase data from Input Device 210 (FIG. 1) or by the voice recognition system, which is stored in Area 292 of RAM 206 (FIG. 49) (S1). By way of inputting specific data from Input Device 210, the property of notice mode (i.e., vibration ON/OFF, sound ON/OFF and the type of sound, indicator ON/OFF, and the type of color) is set and the relevant data are stored in Area 271 (i.e., Areas 251*a*, 252*a*, 253*a*) (FIG. 49) of RAM 206 by the programs stored in Areas 251, 252, 253 of ROM 207 (FIG. 48) (S2). Communication Device 200 initiates a dialing process (S3) until it is connected to Host H (described hereinafter) (S4) and sends the stock purchase data thereto.

Figure 51:
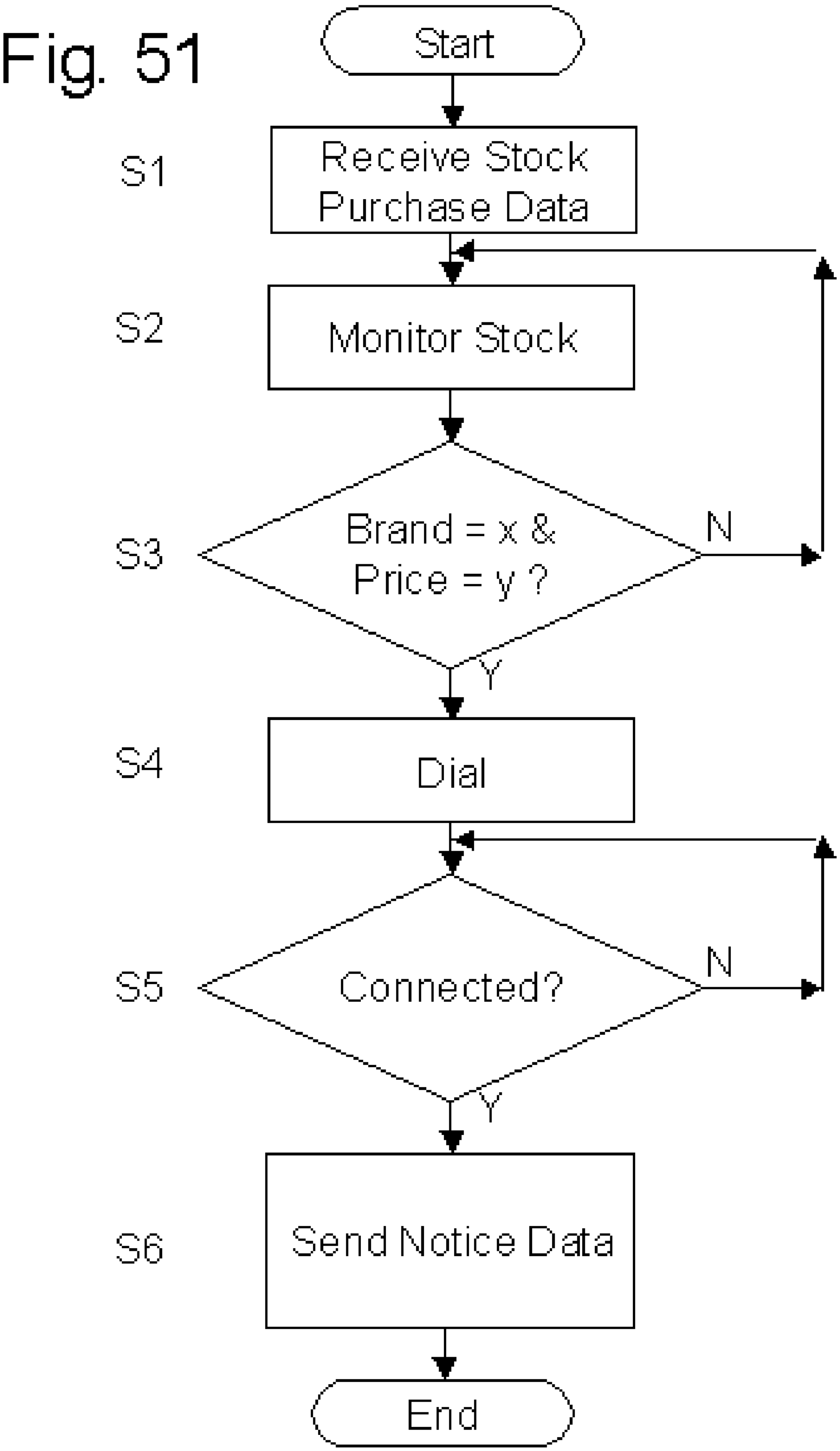
FIG. 51 is a flowchart illustrating an exemplary embodiment of the present invention.

FIG. 51 illustrates the operation of Host H (not shown). As soon as Host H receives the stock purchase data from Communication Device 200 (S1), it initiates to monitor the stock markets which is specified in the stock purchase data (S2). If Host H detects that the price of the certain brand specified in the stock purchase data meets the limited price specified in the stock purchase data, (in the present example if the price of brand x is y) (S3), it initiates a dialing process (S4) until it is connected to Communication Device 200 (S5) and sends a notice data thereto (S6).

Figure 52:
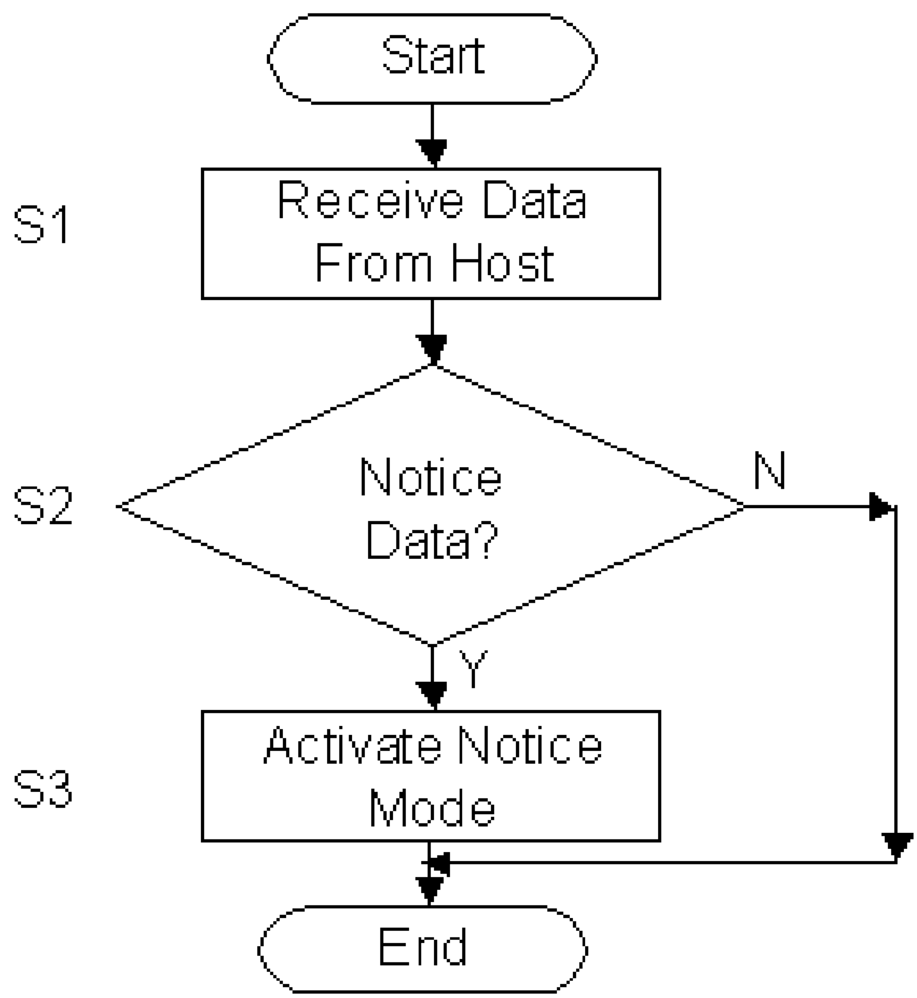
FIG. 52 is a flowchart illustrating an exemplary embodiment of the present invention.

As illustrated in FIG. 52, Communication Device 200 periodically monitors the data received from Host H (not shown) (S1). If the data received is a notice data (S2), the notice mode is activated in the manner in compliance with the settings stored in setting data Area 271 (FIG. 49) of RAM 206 (S3). In the example illustrated in FIG. 49, Vibrator 217 (FIG. 1) is turned on, Sound Data J is emitted from Speaker 216 (FIG. 1), and Indicator 212 (FIG. 1) emits Color M.

<<Stock Purchase—Summary>>

The foregoing invention may be summarized as the following.

A communication system comprising a first computer and a second computer wherein said second computer is a wireless communication device including an antenna, a stock purchase data is input to said second computer, said first computer monitors one or more stock markets specified in said stock purchase data and sends a notice to said second computer, and said second computer responds in a specified manner upon receiving said notice from said antenna in a wireless fashion thereby enabling the user of said second computer to receive said notice regarding said stock purchase data in any location wherever he/she desires.

<<Timer Email Function>>

Figure 53A:
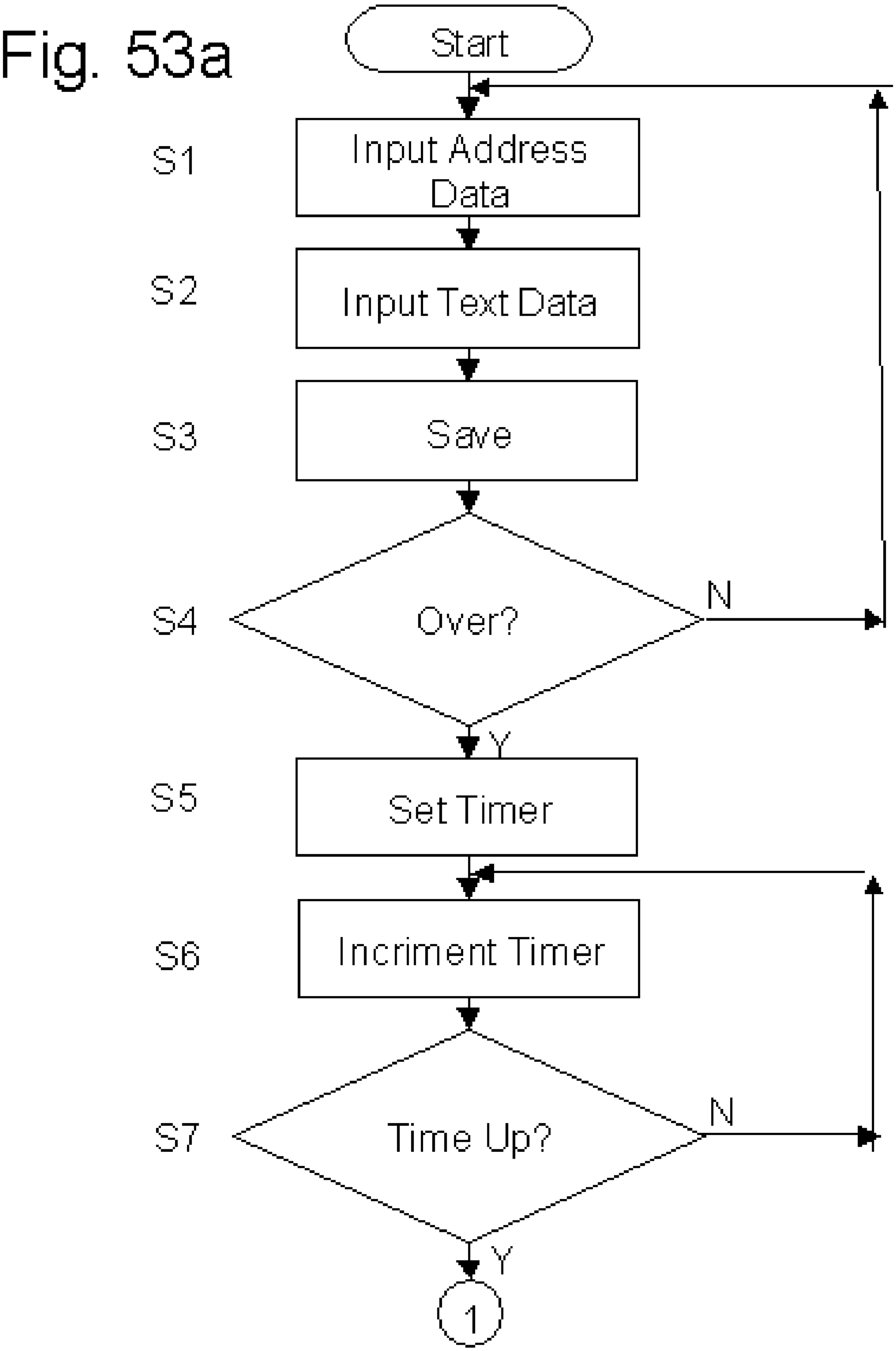
FIG. 53*a* is a flowchart illustrating an exemplary embodiment of the present invention.
Figure 53B:
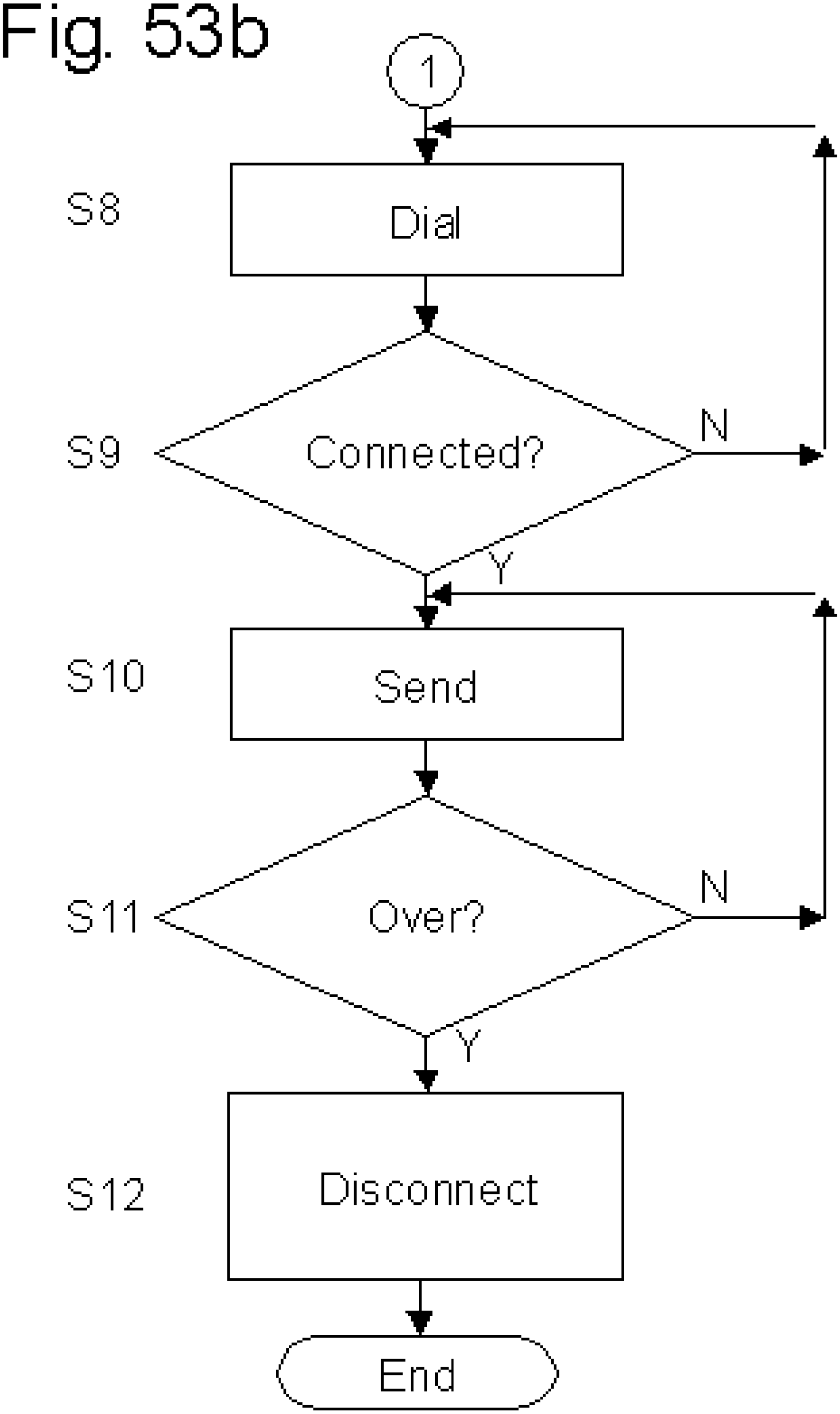
FIG. 53*b* is a flowchart illustrating an exemplary embodiment of the present invention.

FIGS. 53*a* and 53*b* illustrate the method of sending emails from Communication Device 200 (FIG. 1) by utilizing a timer.

Address data, i.e., email address is input by utilizing Input Device 210 (FIG. 1) or via voice recognition system explained in FIG. 3, FIG. 4, FIG. 5, FIG. 13, FIG. 14, FIG. 14*a*, FIG. 15, FIG. 16 and/or FIG. 17 (S1) and the text data, the text of the email message is input by the same manner (S2). The address data and the text data are automatically saved in RAM 206 (FIG. 1) (S3). The sequence of S1 through S3 is repeated (i.e., writing more than one email) until a specified input signal is input from Input Device 210 (FIG. 1) or by utilizing the voice recognition system explained above. Once inputting both the address data and the text data (which also includes numeric data, images and programs) are completed a timer (not shown) is set by Input Device 210 or by utilizing the voice recognition system (S5), and the timer is incremented periodically (S6) until the timer value equals the predetermined value specified in S5 (S7). A dialing process is continued (S8) until the line is connected (S9) and the text data are sent thereafter to email addresses specified in S1 (S10). All of the emails are sent (S11) and the line is disconnected thereafter (S12).

As another embodiment of the present invention a specific time may be input by Input Device 210 and send the text data on the specific time (i.e., a broad meaning of 'timer').

<<Timer Email—Summary>>

The foregoing invention may be summarized as the following.

A communication device comprising a text data input means which inputs one or more text data, a storage means which stores said text data, a sending means which sends said text data which is input by said input means, and a timer means which activates said sending means at a predetermined time wherein said text data input means input said text data, said storage means stores said text data input by said text data input means, said timer means activates said sending means at said predetermined time, and said sending means sends said text data at said predetermined time thereby enabling the user of said communication device to send said text data at said predetermined time at which said user is not able to send said text data.

<<Call Blocking Function>>

Figure 54:
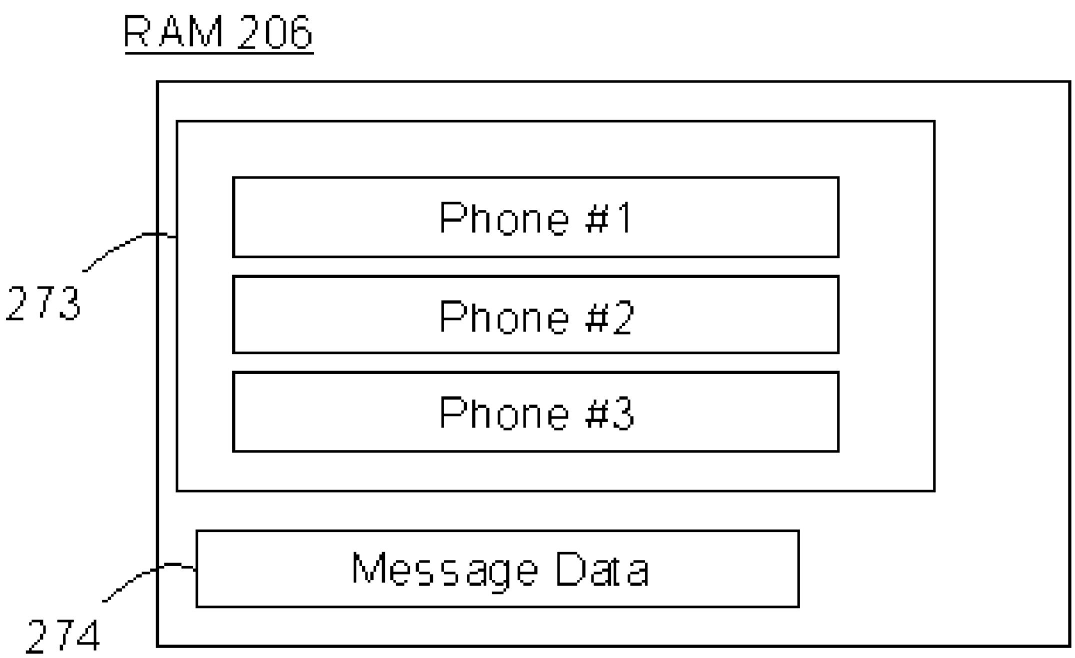
FIG. 54 is a block diagram illustrating an exemplary embodiment of the present invention.
Figure 55:
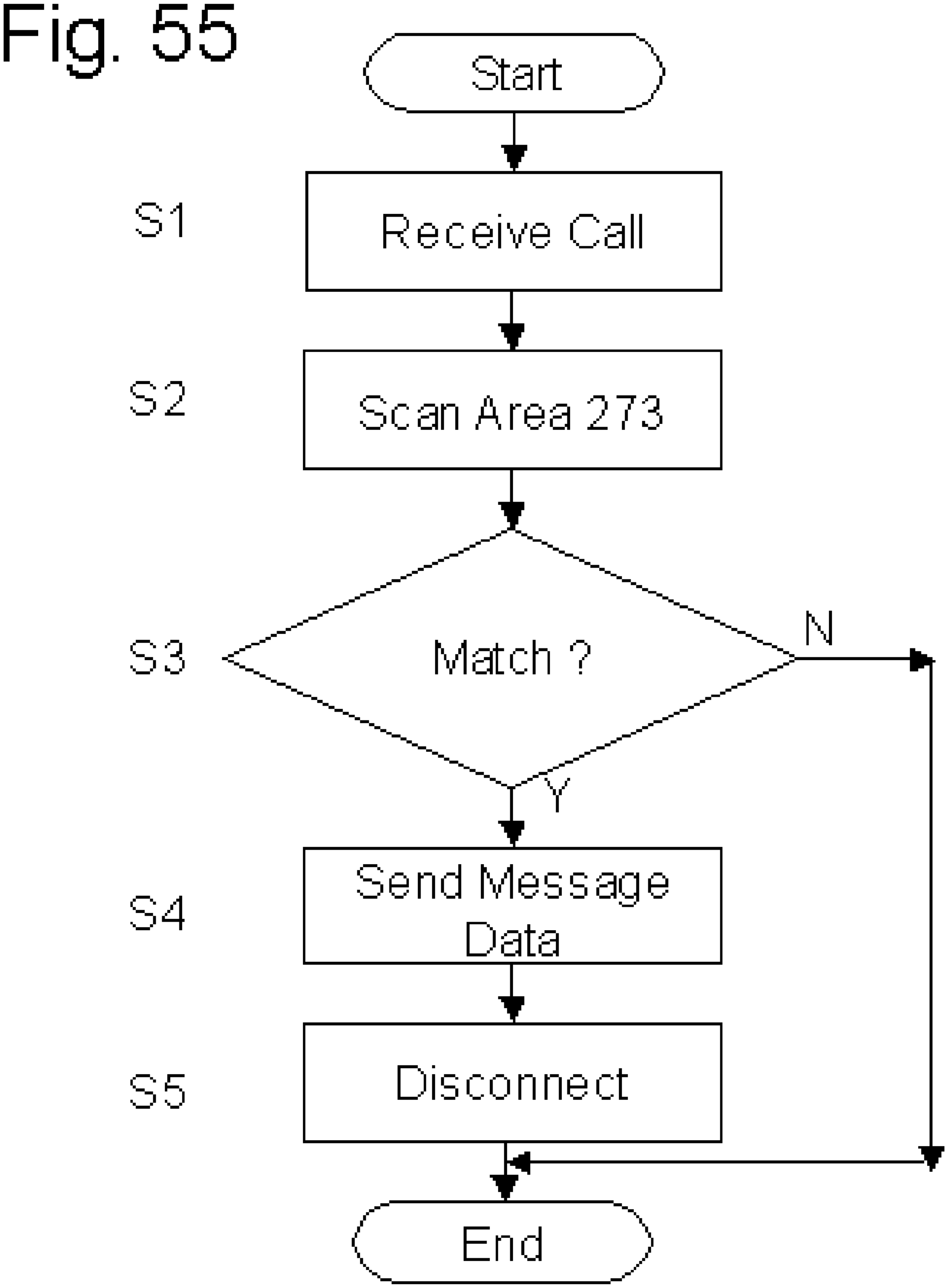
FIG. 55 is a flowchart illustrating an exemplary embodiment of the present invention.
Figure 56:
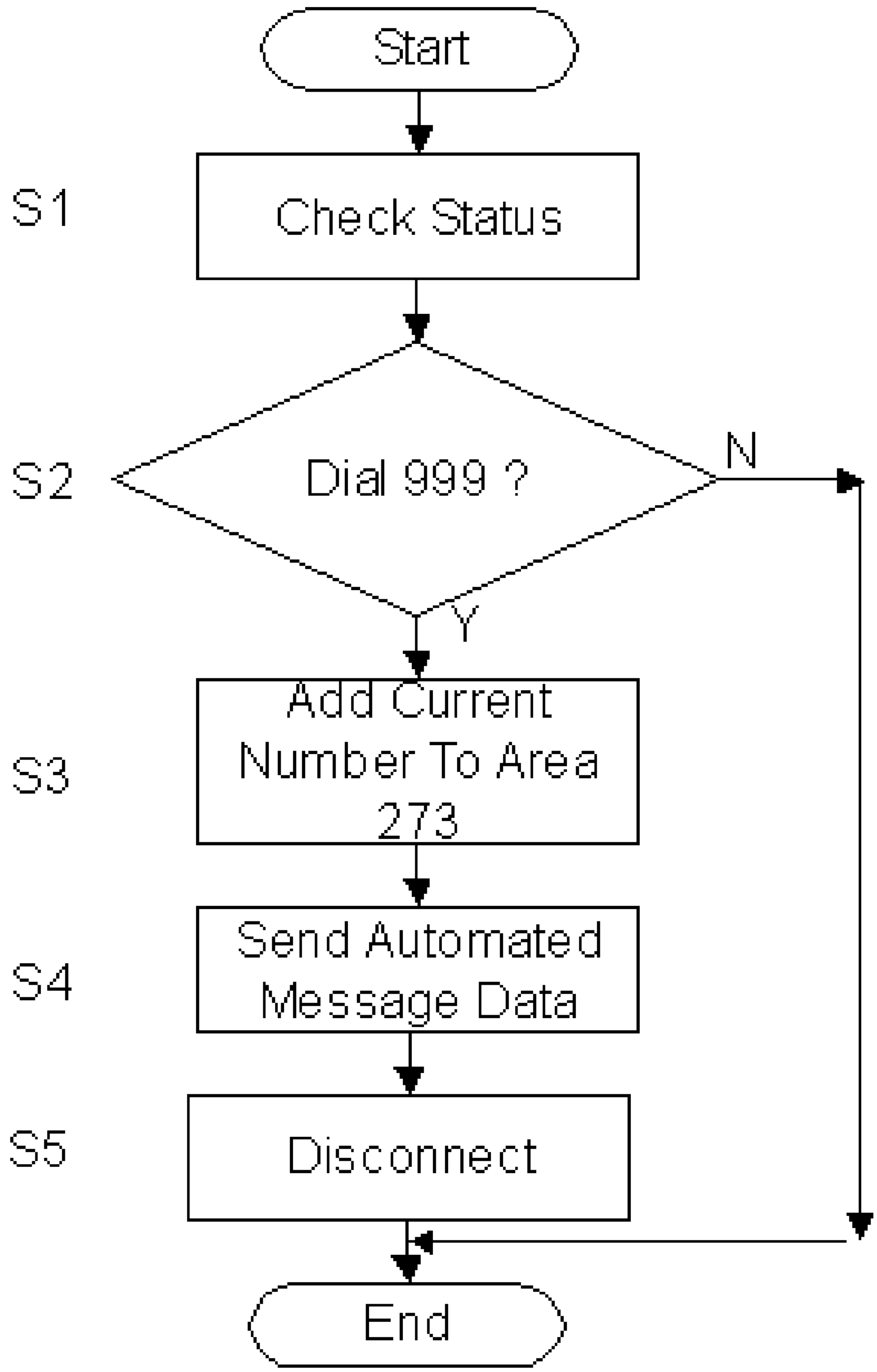
FIG. 56 is a flowchart illustrating an exemplary embodiment of the present invention.

FIGS. 54 through 56 illustrates the so-called 'call blocking' function of Communication Device 200 (FIG. 1).

As illustrated in FIG. 54, RAM 206 (FIG. 1) includes Area 273 and Area 274. Area 273 stores phone numbers that should be blocked. In the example illustrated in FIG. 54, Phone #1, Phone #2, and Phone #3 are blocked. Area 274 stores a message data, preferably a wave data, stating that the phone can not be connected.

FIG. 55 illustrates the operation of Communication Device 200. When Communication Device 200 receives a call (S1), CPU 211 (FIG. 1) scans Area 273 (FIG. 54) of RAM 206 (S2). If the phone number of the incoming call matches one of the phone numbers stored in Area 273 (S3), CPU 211 sends the message data stored in Area 274 (FIG. 54) of RAM 206 to the caller device (S4) and disconnects the line (S5).

FIG. 56 illustrates the method of updating Area 273 (FIG. 54) of RAM 206. Assuming that the phone number of the incoming call does not match any of the phone numbers stored in Area 273 of RAM 206 (see S3 of FIG. 55). In that case, Communication Device 200 is connected to the caller device. However, the user of Communication Device 200 may decide to have such number 'blocked' after all. If that is the case, the user dials '999' while the line is connected. Technically CPU 211 (FIG. 1) periodically checks the signals input from Input Device 210 (FIG. 1) (S1). If the input signal represents a numerical data '999' from Input Device 210 (S2), CPU 211 adds the phone number of the pending call to Area 273 (S3) and sends the message data stored in Area 274 (FIG. 54) of RAM 206 to the caller device (S4). The line is disconnected thereafter (S5).

Figure 57:
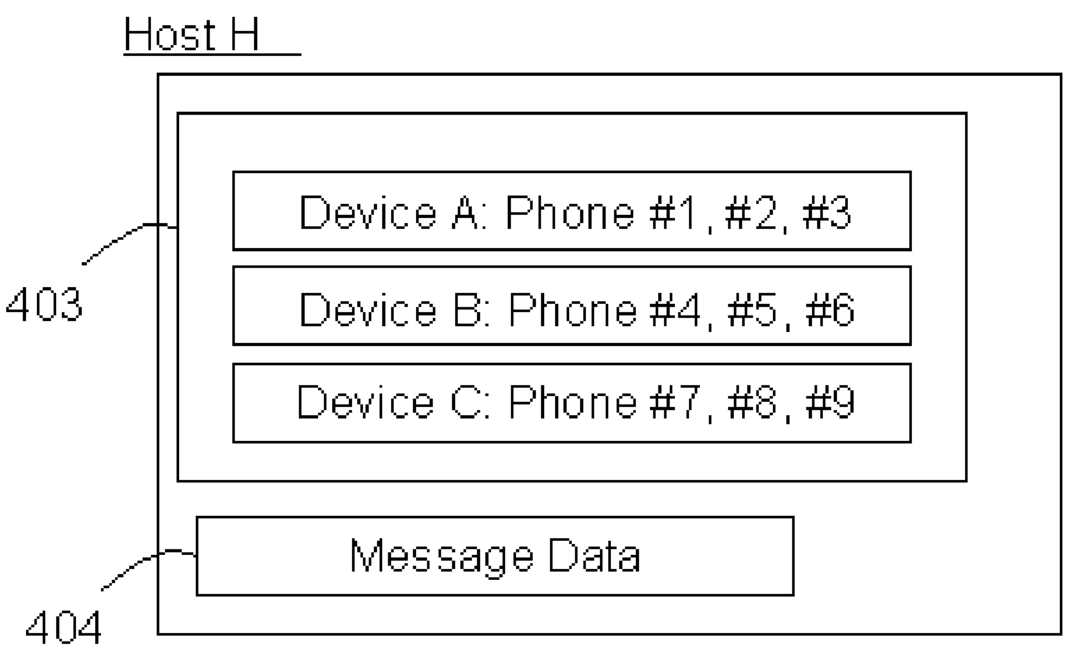
FIG. 57 is a block diagram illustrating an exemplary embodiment of the present invention.
Figure 58:
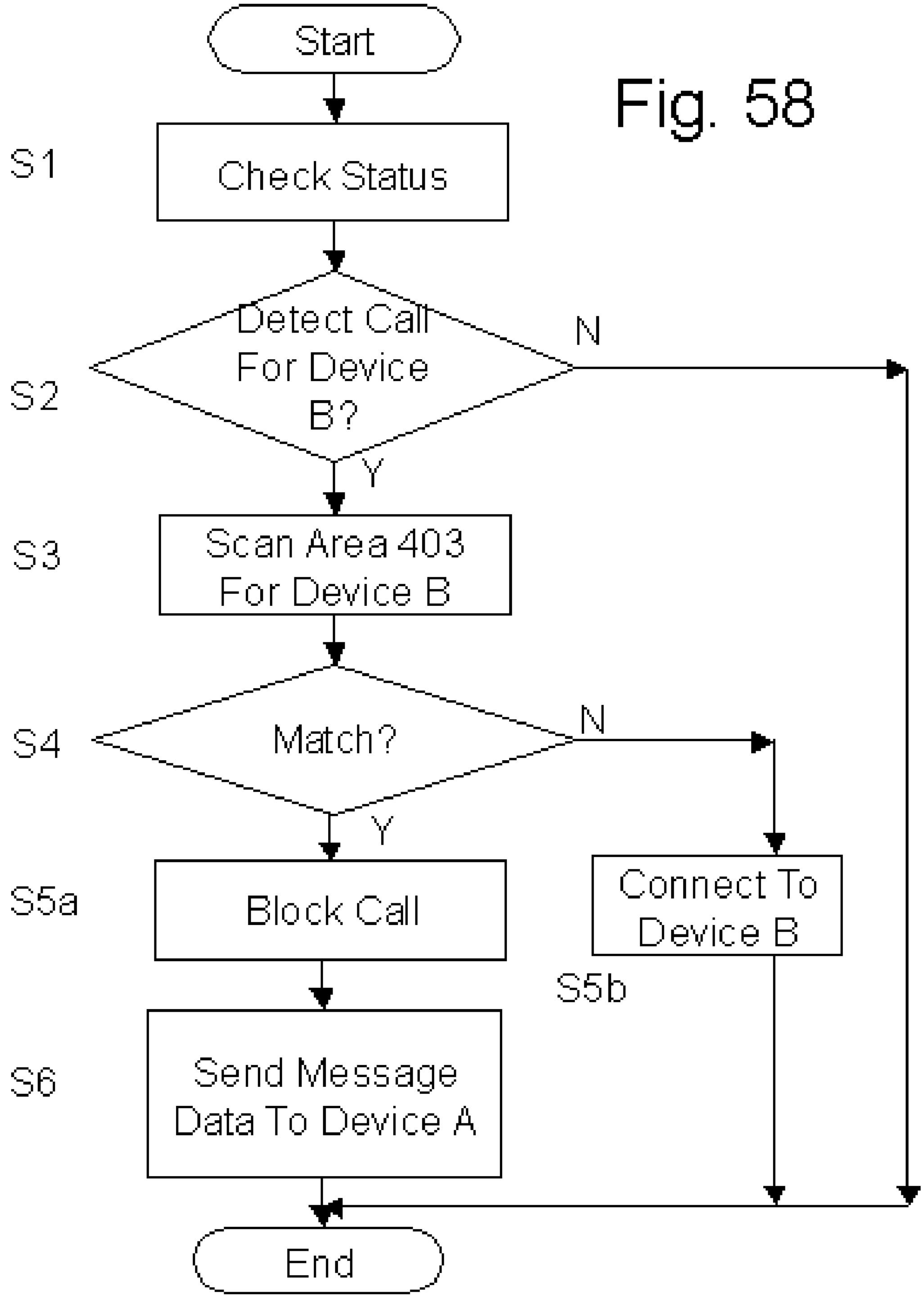
FIG. 58 is a flowchart illustrating an exemplary embodiment of the present invention.
Figure 59:
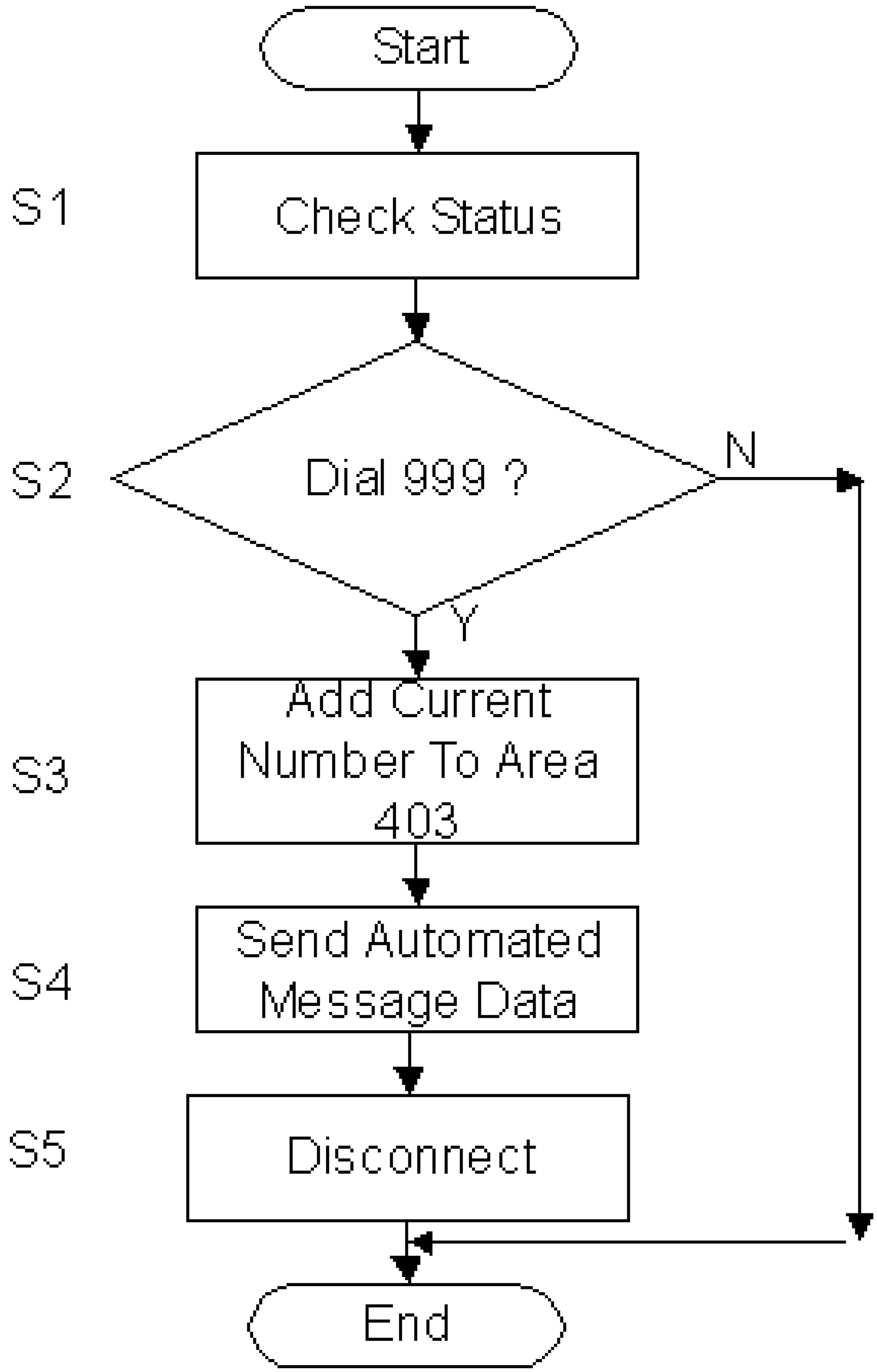
FIG. 59 is a flowchart illustrating an exemplary embodiment of the present invention.

FIGS. 57 through 59 illustrate another embodiment of the present invention.

As illustrated in FIG. 57, Host H (not shown) includes Area 403 and Area 404. Area 403 stores phone numbers that should be blocked to be connected to Communication Device 200. In the example illustrated in FIG. 57, Phone #1, Phone #2, and Phone #3 are blocked for Device A; Phone #4, Phone #5, and Phone #6 are blocked for Device B; and Phone #7, Phone #8, and Phone #9 are blocked for Device C. Area 404 stores a message data stating that the phone can not be connected.

FIG. 58 illustrates the operation of Host H (not shown). Assuming that the caller device is attempting to connect to Device B, Communication Device 200. Host H periodically checks the signals from all Communication Device 200 (S1). If Host H detects a call for Device B (S2), it scans Area 403 (FIG. 57) (S3) and checks whether the phone number of the incoming call matches one of the phone numbers stored therein for Device B (S4). If the phone number of the incoming call does not match any of the phone numbers stored in Area 403, the line is connected to Device B (S5*b*). On the other hand, if the phone number of the incoming call matches one of the phone numbers stored in Area 403, the line is 'blocked,' i.e., not connected to Device B (S5*a*) and Host H sends the massage data stored in Area 404 (FIG. 57) to the caller device (S6).

FIG. 59 illustrates the method of updating Area 403 (FIG. 57) of Host H. Assuming that the phone number of the incoming call does not match any of the phone numbers stored in Area 403 (see S4 of FIG. 58). In that case, Host H allows the connection between the caller device and Communication Device 200, however, the user of Communication Device 200 may decide to have such number 'blocked' after all. If that is the case, the user simply dials '999' while the line is connected. Technically Host H (FIG. 57) periodically checks the signals input from Input Device 210 (FIG. 1) (S1). If the input signal represents '999' from Input Device 210 (FIG. 1) (S2), Host H adds the phone number of the pending call to Area 403 (S3) and sends the message data stored in Area 404 (FIG. 57) to the caller device (S4). The line is disconnected thereafter (S5).

As another embodiment of the method illustrated in FIG. 59, Host H (FIG. 57) may delegate some of its tasks to Communication Device 200 (this embodiment is not shown in drawings). Namely, Communication Device 200 periodically checks the signals input from Input Device 210 (FIG. 1). If the input signal represents a numeric data '999' from Input Device 210, Communication Device 200 sends to Host H a block request signal as well as with the phone number of the pending call. Host H, upon receiving the block request signal from Communication Device 200, adds the phone number of the pending call to Area 403 (FIG. 57) and sends the message data stored in Area 404 (FIG. 57) to the caller device. The line is disconnected thereafter.

<<Call Blocking—Summary>>

The foregoing invention may be summarized as the following.

(1) A communication system comprising a communication device and a blocked number storage means wherein an incoming call is prevented from being connected to said communication device if the phone number of said incoming call is included in said blocked number storage means thereby preventing the user of said communication device from being disturbed from unnecessary calls.

(2) A communication system comprising a communication device and a blocked number storage means wherein a pending call is disconnected from said communication device if a predetermined signal is input to said communication device and the phone number of said pending call is included in said blocked number storage means thereby preventing the user of said communication device from being disturbed from unnecessary calls.

<<Online Payment Function>>

FIGS. 60 through 64 illustrate the method of online payment by utilizing Communication Device 200 (FIG. 1).

Figure 60:
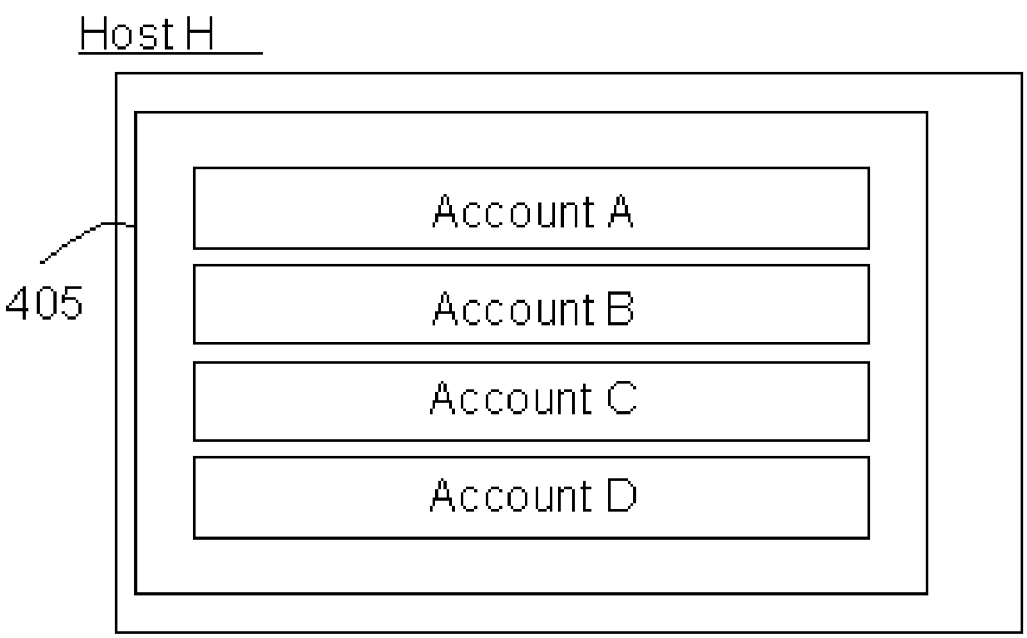
FIG. 60 is a block diagram illustrating an exemplary embodiment of the present invention.

As illustrated in FIG. 60, Host H includes account data storage Area 405. All of the account data of the users of Communication Device 200 who have signed up for the online payment service are stored in Area 405. In the example described in FIG. 60, Account A stores the relevant account data of the user using Device A; Account B stores the relevant account data of the user using Device B; Account C stores the relevant account data of the user using Device C; and Account D stores the relevant account data of the user using device D. Here, Devices A, B, C, and D are Communication Device 200.

Figure 61A:
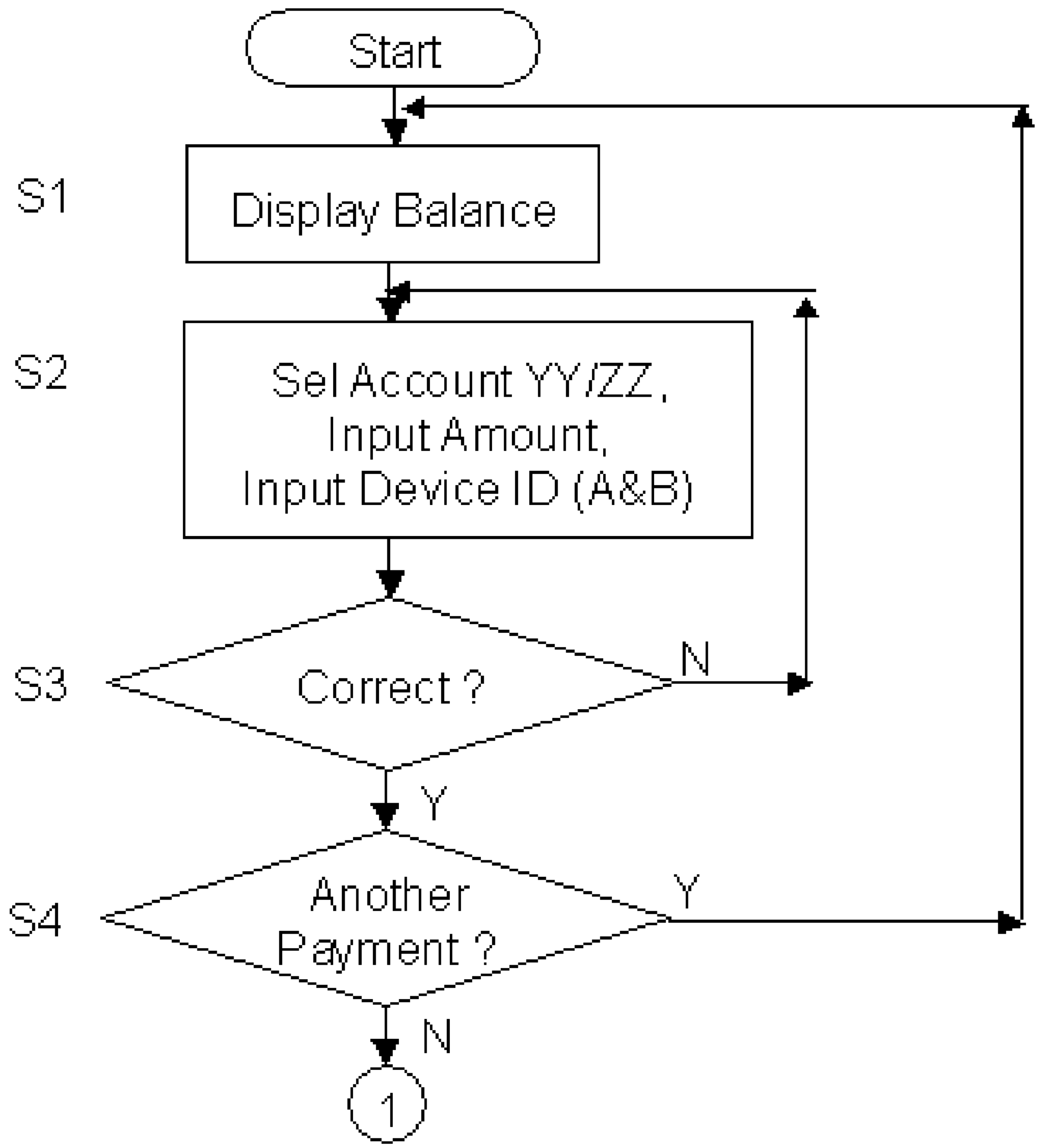
FIG. 61*a* is a flowchart illustrating an exemplary embodiment of the present invention.
Figure 61B:
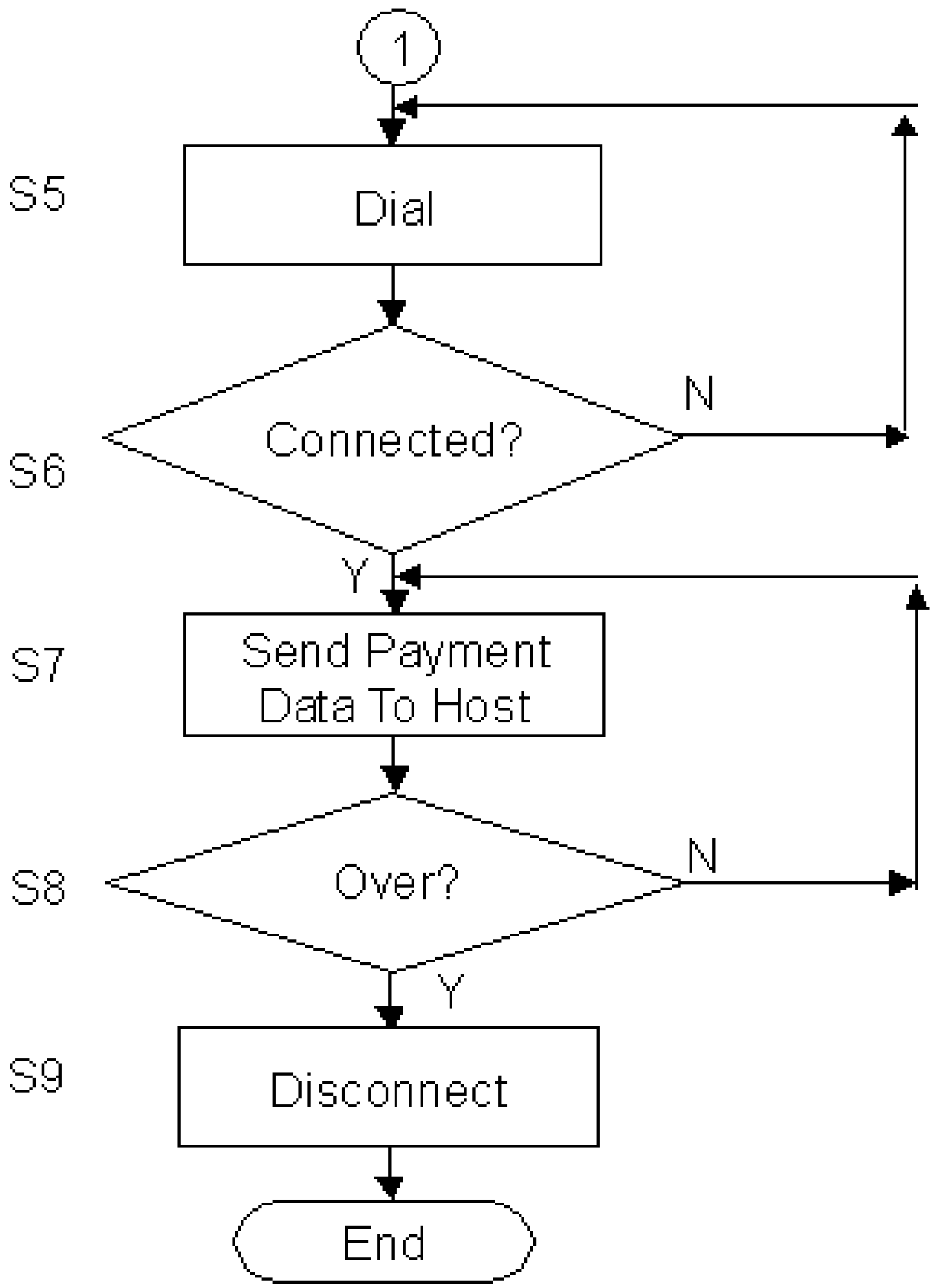
FIG. 61*b* is a flowchart illustrating an exemplary embodiment of the present invention.

FIGS. 61*a* and 61*b* illustrate the operation of the payer device, Communication Device 200. Assuming that Device A is the payer device and Device B is the payee device. Account A explained in FIG. 60 stores the account data of the user of Device A, and Account B explained in the same drawing stores the account data of the user of Device B. As illustrated in FIG. 61*a*, LCD 201 (FIG. 1) of Device A displays the balance of Account A by receiving the relevant data from Host H (FIG. 60) (S1). From the signal input from Input Device 210 (FIG. 1), the payer's account and the payee's account are selected (in the present example, Account A as the payer's account and Account B as the payee's account are selected), and the amount of payment and the device ID (in the present example, Device A as the payer's device and Device B as the payee's device) are input via Input Device 210 (S2). If the data input from Input Device 210 is correct (S3), CPU 211 (FIG. 1) of Device A prompts for other payments. If there are other payments to make, the sequence of S1 through S3 is repeated until all of the payments are made (S4). The dialing process is initiated and repeated thereafter (S5) until the line is connected to Host H (FIG. 60) (S6). Once the line is connected, Device A sends the payment data to Host H (S7). The line is disconnected when all of the payment data including the data produced in S2 are sent to Host H (S8 and S9).

Figure 62:
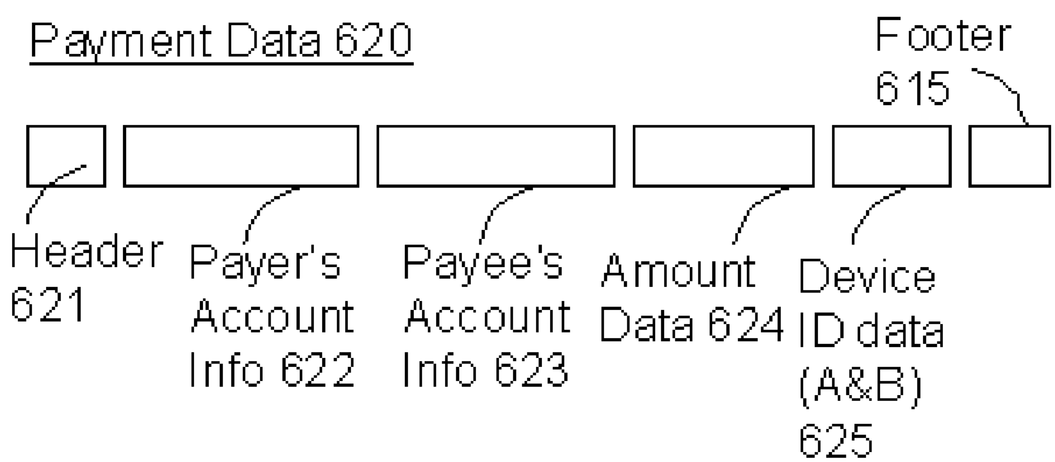
FIG. 62 is a simplified illustration illustrating an exemplary embodiment of the present invention.

FIG. 62 illustrates the payment data described in S7 of FIG. 61*b*. Payment data 620 is composed of Header 621, Payer's Account Information 622, Payee's Account Information 623, amount data 624, device ID data 625, and Footer 615. Payer's Account Information 622 represents the information regarding the payer's account data stored in Host H (FIG. 60) which is, in the present example, Account A. Payee's Account Information 623 represents the information regarding the payee's account data stored in Host H which is, in the present example, Account B. Amount Data 624 represents the amount of monetary value either in the U.S. dollars or in other currencies which is to be transferred from the payer's account to the payee's account. The device ID data represents the data of the payer's device and the payee's device, i.e., in the present example, Device A and Device B.

Figure 63:
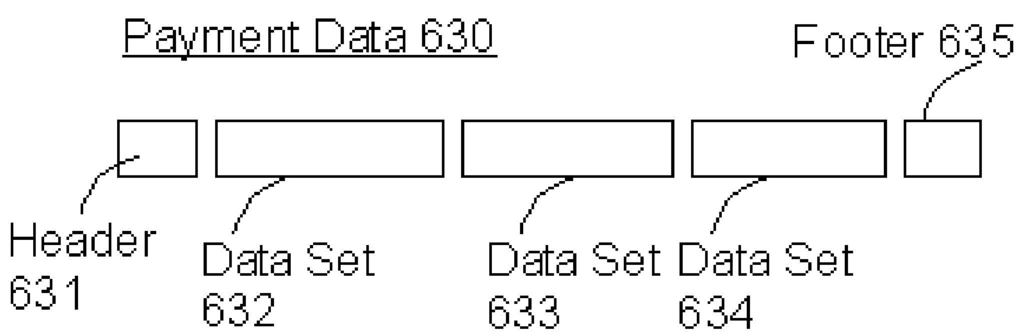
FIG. 63 is a simplified illustration illustrating an exemplary embodiment of the present invention.

FIG. 63 illustrates the basic structure of the payment data described in S7 of FIG. 61*b* when multiple payments are made, i.e., when more than one payment is made in S4 of FIG. 61*a*. Assuming that three payments are made in S4 of FIG. 61*a*. In that case, Payment Data 630 is composed of Header 631, Footer 635, and three data sets, i.e., Data Set 632, Data Set 633, Data Set 634. Each data set represents the data components described in FIG. 62 excluding Header 621 and Footer 615.

Figure 64:
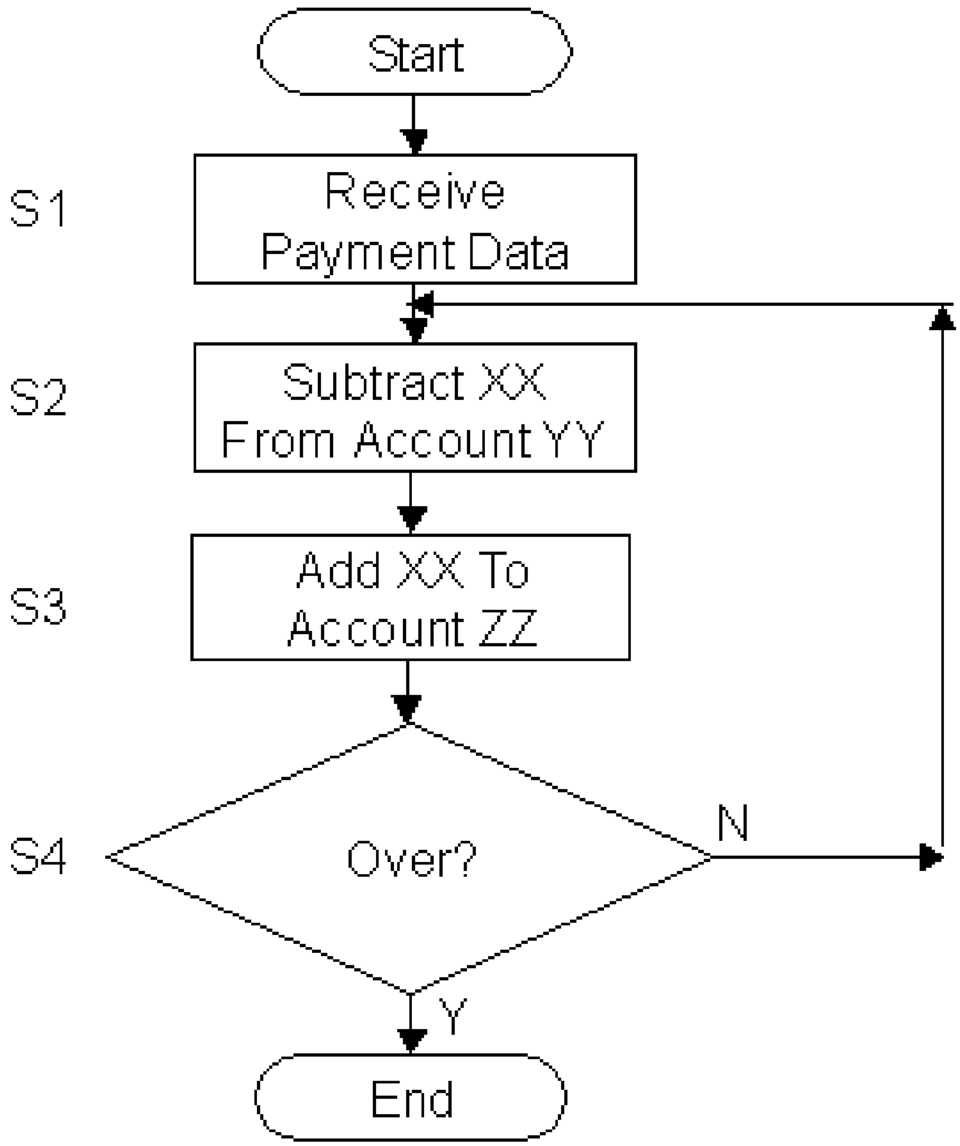
FIG. 64 is a flowchart illustrating an exemplary embodiment of the present invention.

FIG. 64 illustrates the operation of Host H (FIG. 60). After receiving payment data from Device A described in FIGS. 62 and 63, Host H retrieves therefrom the payer's account information (in the present example Account A), the payee's account information (in the present example Account B), the amount data which represents the monetary value, and the device IDs of both the payer's device and the payee's device (in the present example Device A and Device B) (S1). Host H, based on such data, subtracts the monetary value represented by the amount data from the payer's account (in the present example Account A) (S2), and adds the same amount to the payee's account (in the present example Account B) (S3). If there are other payments to make, i.e., if Host H received a payment data which has a structure of the one described in FIG. 63, the sequence of S2 and S3 is repeated as many times as the amount of the data sets are included in such payment data.

<<Online Payment—Summary>>

The foregoing invention may be summarized as the following.

An online payment system comprising a host and a first device and a second device wherein said host and said first device are connected in a wireless fashion; said host and said second device are also connected in a wireless fashion; said host stores a first account data of said first device and a second account data of said second device; a payment data which includes an amount data representing monetary value, said first account data, and said second account data is input into said first device; said payment data is sent to said host in a wireless fashion; and said host subtracts the value represented by said amount data from said first account data and adds the same value to said second account data thereby enables the users of said first device and said second device to initiate transactions and payments at any location wherever they desire.

<<Navigation System>>

FIGS. 65 through 74 illustrate the navigation system of Communication Device 200 (FIG. 1).

Figure 65:
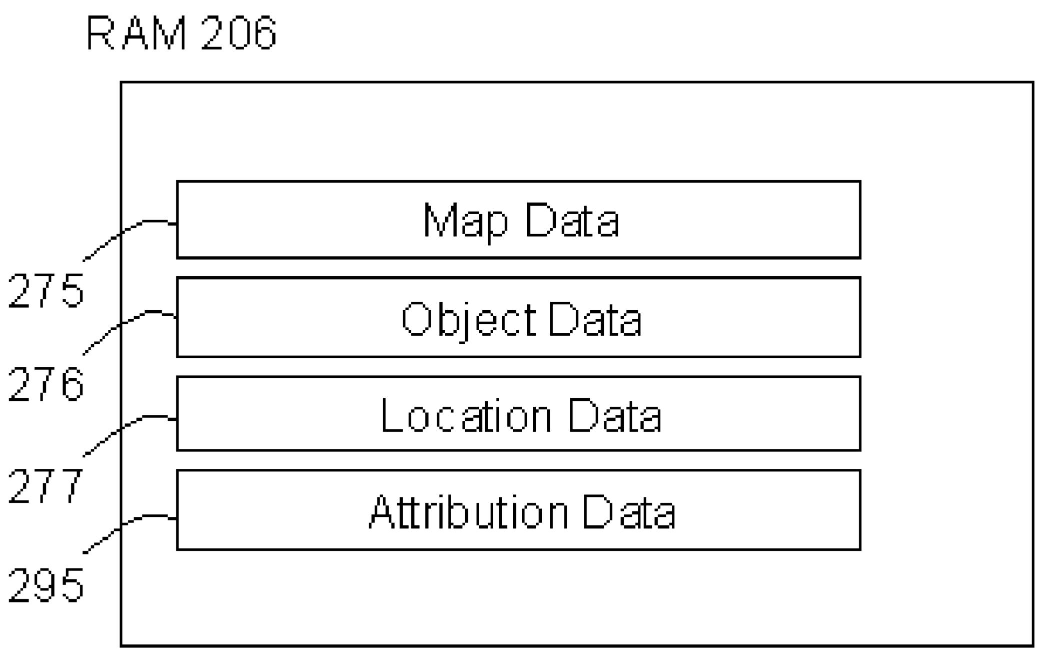
FIG. 65 is a block diagram illustrating an exemplary embodiment of the present invention.

As illustrated in FIG. 65, RAM 206 (FIG. 1) includes Area 275, Area 276, Area 277, and Area 295. Area 275 stores a plurality of map data, two-dimensional (2D) image data, which are designed to be displayed on LCD 201 (FIG. 1). Area 276 stores a plurality of object data, three-dimensional (3D) image data, which are also designed to be displayed on LCD 201. The object data are primarily displayed by a method so-called 'texture mapping' which is explained in details hereinafter. Here, the object data include the three-dimensional data of various types of objects that are displayed on LCD 201, such as bridges, houses, hotels, motels, inns, gas stations, restaurants, streets, traffic lights, street signs, trees, etc. Area 277 stores a plurality of location data, i.e., data representing the locations of the objects stored in Area 276. Area 277 also stores a plurality of data representing the street address of each object stored in Area 276. In addition, Area 277 stores the current position data of Communication Device 200 and the Destination Data which are explained in details hereafter. The map data stored in Area 275 and the location data stored in Area 277 are linked each other. Area 295 stores a plurality of attribution data attributing to the map data stored in Area 275 and location data stored in Area 277, such as road blocks, traffic accidents, and road constructions, and traffic jams. The attribution data stored in Area 295 is updated periodically by receiving an updated data from a host (not shown).

Figure 66:
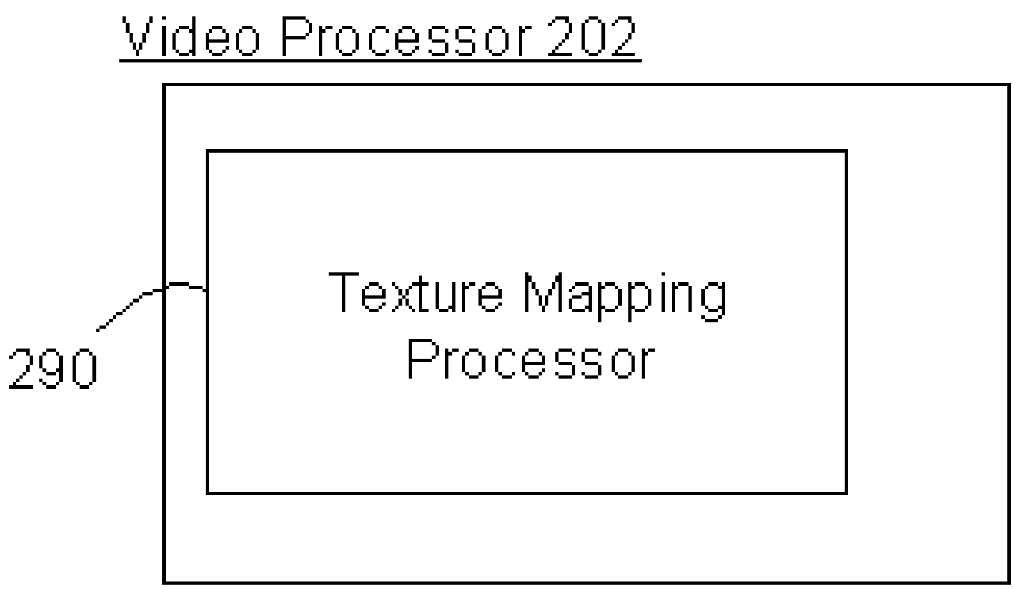
FIG. 66 is a block diagram illustrating an exemplary embodiment of the present invention.

As illustrated in FIG. 66, Video Processor 202 (FIG. 1) includes texture mapping processor 290. Texture mapping processor 290 produces polygons in a three-dimensional space and 'pastes' textures to each polygon. The concept of such method is described in the following patents and the references cited thereof: U.S. Pat. No. 5,870,101, U.S. Pat. No. 6,157,384, U.S. Pat. No. 5,774,125, U.S. Pat. No. 5,375,206, and/or U.S. Pat. No. 5,925,127.

Figure 67:
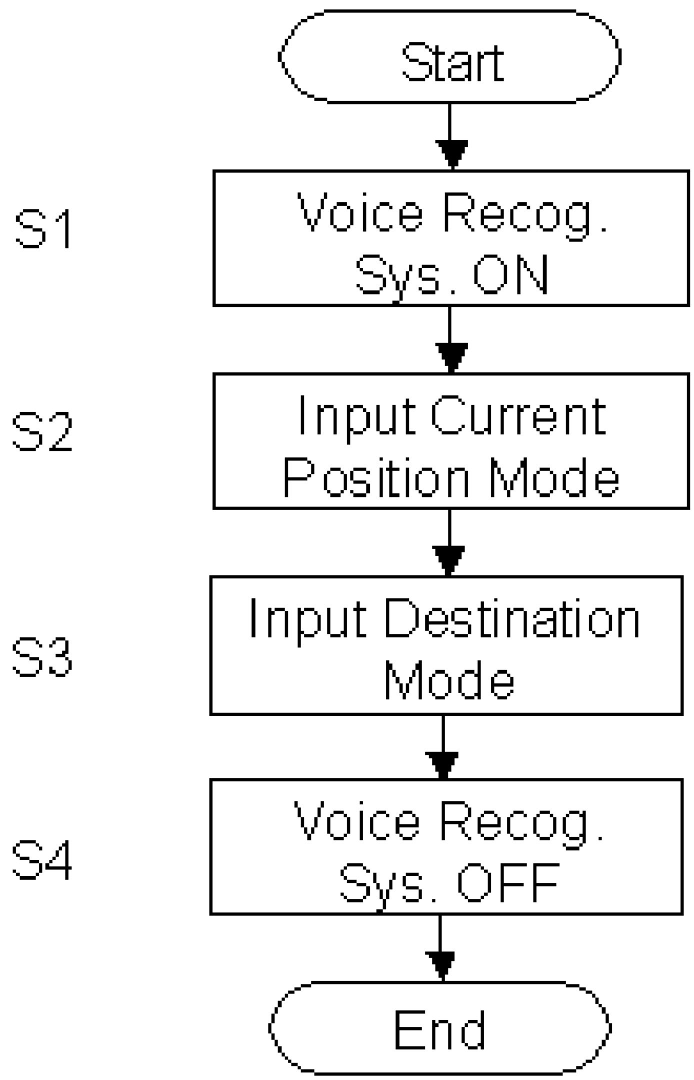
FIG. 67 is a flowchart illustrating an exemplary embodiment of the present invention.

As illustrated in FIG. 67, the voice recognition system is activated when the CPU 211 (FIG. 1) detects a specific signal input from Input Device 210 (FIG. 1) (S1). After the voice recognition system is activated, the input current position mode starts and the current position of Communication Device 200 is input by voice recognition system explained in FIG. 3, FIG. 4, FIG. 5, FIG. 13, FIG. 14, FIG. 14*a*, FIG. 15, FIG. 16 and/or FIG. 17 (S2). The current position can also be input from Input Device 210. As another embodiment of the present invention, the current position can automatically be detected by the method so-called 'global positioning system' or 'GPS' as illustrated in FIGS. 20*a* through 26 and input the current data therefrom. After the process of inputting the current data is completed, the input destination mode starts and the destination is input by the voice recognition system explained above or by the Input Device 210 (S3), and the voice recognition system is deactivated after the process of inputting the Destination Data is completed by utilizing such system (S4).

Figure 68:
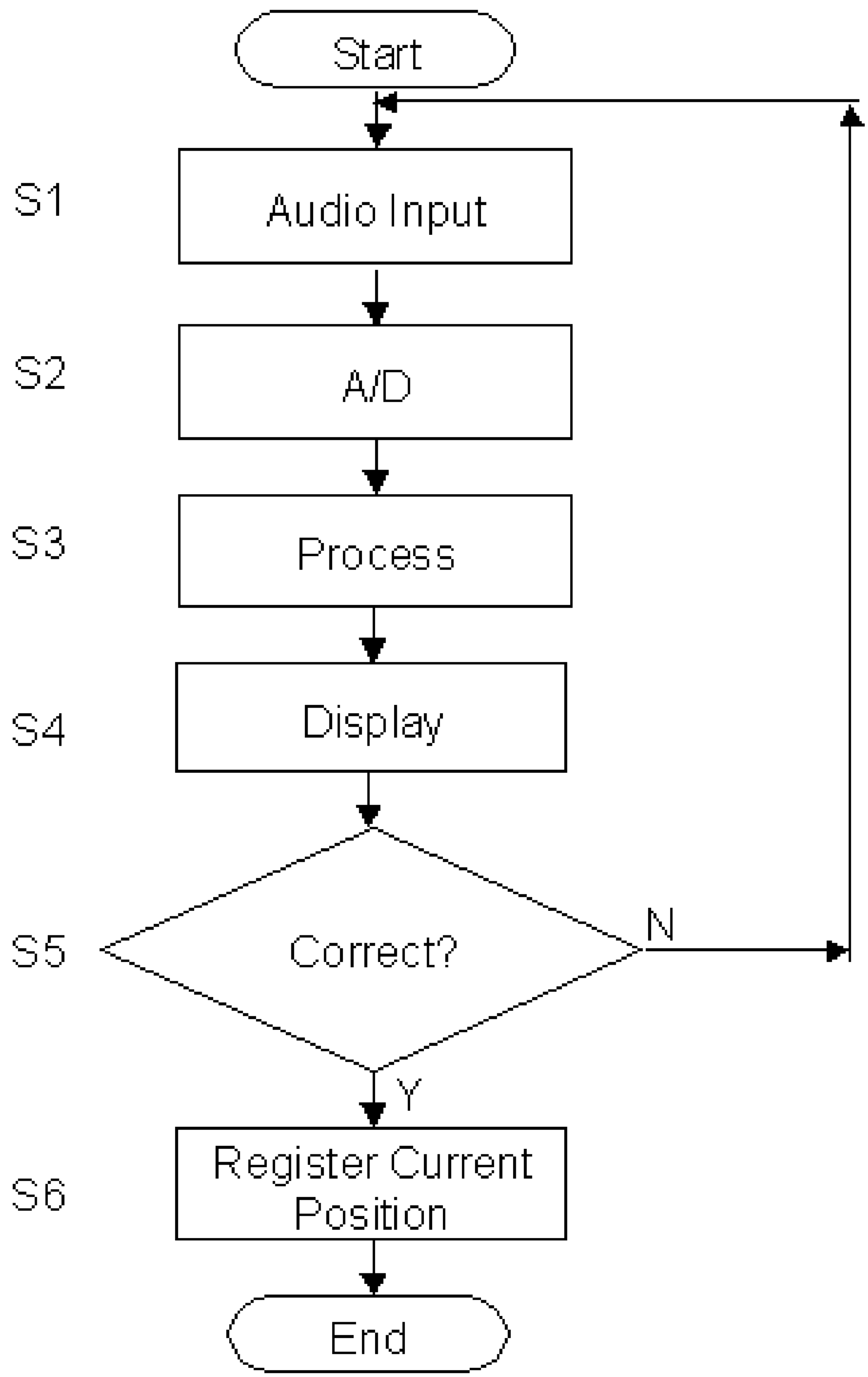
FIG. 68 is a flowchart illustrating an exemplary embodiment of the present invention.

FIG. 68 illustrates the sequence of the input current position mode described in S2 of FIG. 67. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed (S5). If the correct data is displayed, such data is registered as current position data (S6). As stated above, the current position data can be input manually by Input Device 210 (FIG. 1) and/or can be automatically input by utilizing the method so-called 'global positioning system' or 'GPS' as described hereinbefore.

Figure 69:
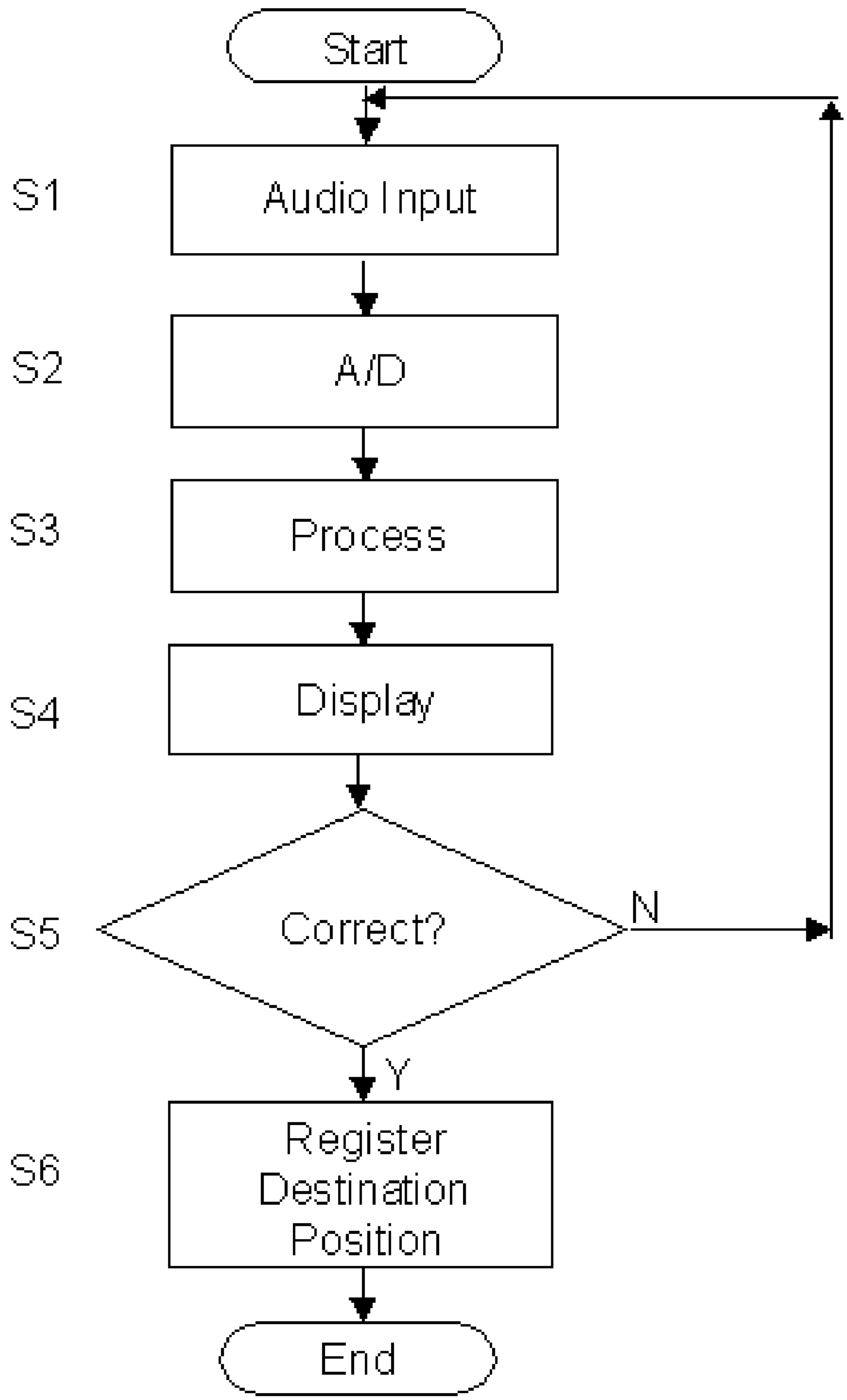
FIG. 69 is a flowchart illustrating an exemplary embodiment of the present invention.

FIG. 69 illustrates the sequence of the input destination mode described in S3 of FIG. 67. When analog audio data is input from Microphone 215 (FIG. 1) (S1), such data is converted into digital audio data by A/D 213 (FIG. 1) (S2). The digital audio data is processed by Sound Processor 205 (FIG. 1) to retrieve text and numeric data therefrom (S3). The retrieved data is displayed on LCD 201 (FIG. 1) (S4). The data can be corrected by repeating the sequence of S1 through S4 until the correct data is displayed on LCD 201 (S5). If the correct data is displayed, such data is registered as Destination Data (S6).

Figure 70:
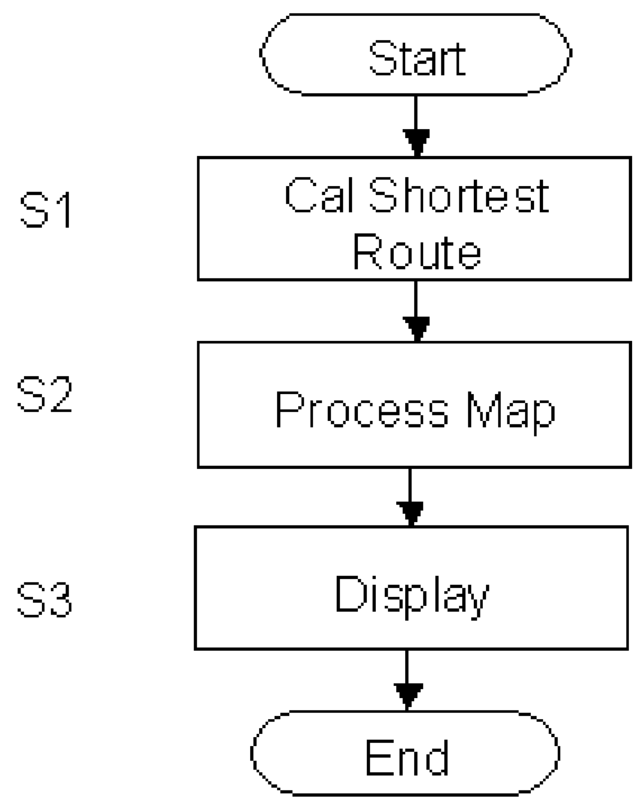
FIG. 70 is a flowchart illustrating an exemplary embodiment of the present invention.

FIG. 70 illustrates the sequence of displaying the shortest route from the current position to the destination. CPU 211 (FIG. 1) retrieves both the current position data and the Destination Data which are input by the method described in FIGS. 67 through 69 from Area 277 (FIG. 65) of RAM 206 (FIG. 1). By utilizing the location data of streets, bridges, traffic lights and other relevant data, CPU 211 calculates the shortest route to the destination (S1). CPU 211 then retrieves the relevant two-dimensional map data which should be displayed on LCD 201 from Area 275 (FIG. 65) of RAM 206 (S2).

As another embodiment of the present invention, by way of utilizing the location data stored in Area 277, CPU 211 may produce a three-dimensional map by composing the three dimensional objects (by method so-called 'texture mapping' as described above) which are stored in Area 276 (FIG. 65) of RAM 206. The two-dimensional map and/or the three dimensional map is displayed on LCD 201 (FIG. 1) (S3).

As another embodiment of the present invention, the attribution data stored in Area 295 (FIG. 65) of RAM 206 may be utilized. Namely if any road block, traffic accident, road construction, and/or traffic jam is included in the shortest route calculated by the method mentioned above, CPU 211 (FIG. 1) calculates the second shortest route to the destination. If the second shortest route still includes road block, traffic accident, road construction, and/or traffic jam, CPU 211 calculates the third shortest route to the destination. CPU 211 calculates repeatedly until the calculated route does not include any road block, traffic accident, road construction, and/or traffic jam. The shortest route to the destination is highlighted by a significant color (such as red) to enable the user of Communication Device 200 to easily recognize such route on LCD 201 (FIG. 1).

As another embodiment of the present invention, an image which is similar to the one which is observed by the user in the real world may be displayed on LCD 201 (FIG. 1) by utilizing the three-dimensional object data. In order to produce such image, CPU 211 (FIG. 1) identifies the present location and retrieves the corresponding location data from Area 277 (FIG. 65) of RAM 206. Then CPU 211 retrieves a plurality of object data which correspond to such location data from Area 276 (FIG. 65) of RAM 206 and displays a plurality of objects on LCD 201 based on such object data in a manner the user of Communication Device 200 may observe from the current location.

Figure 71:
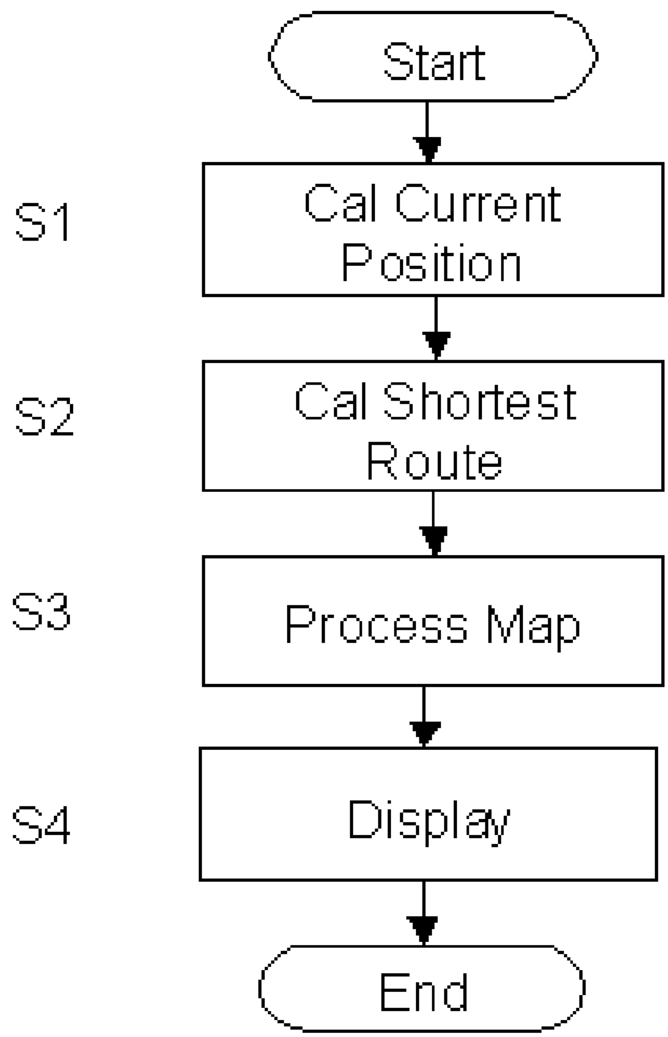
FIG. 71 is a flowchart illustrating an exemplary embodiment of the present invention.

FIG. 71 illustrates the sequence of updating the shortest route to the destination while Communication Device 200 is moving. By way of periodically and automatically inputting the current position by the method so-called 'global positioning system' or 'GPS' as described hereinbefore, the current position is continuously updated (S1). By utilizing the location data of streets and traffic lights and other relevant data, CPU 211 (FIG. 1) recalculates the shortest route to the destination (S2). CPU 211 then retrieves the relevant two-dimensional map data which should be displayed on LCD 201 from Area 275 (FIG. 65) of RAM 206 (S3). Instead, by way of utilizing the location data stored in Area 277 (FIG. 65), CPU 211 may produce a three-dimensional map by composing the three dimensional objects by method so-called 'texture mapping' which are stored in Area 276 (FIG. 65) of RAM 206. The two-dimensional map and/or the three-dimensional map is displayed on LCD 201 (FIG. 1) (S4). The shortest route to the destination is re-highlighted by a significant color (such as red) to enable the user of Communication Device 200 to easily recognize the updated route on LCD 201.

Figure 72:
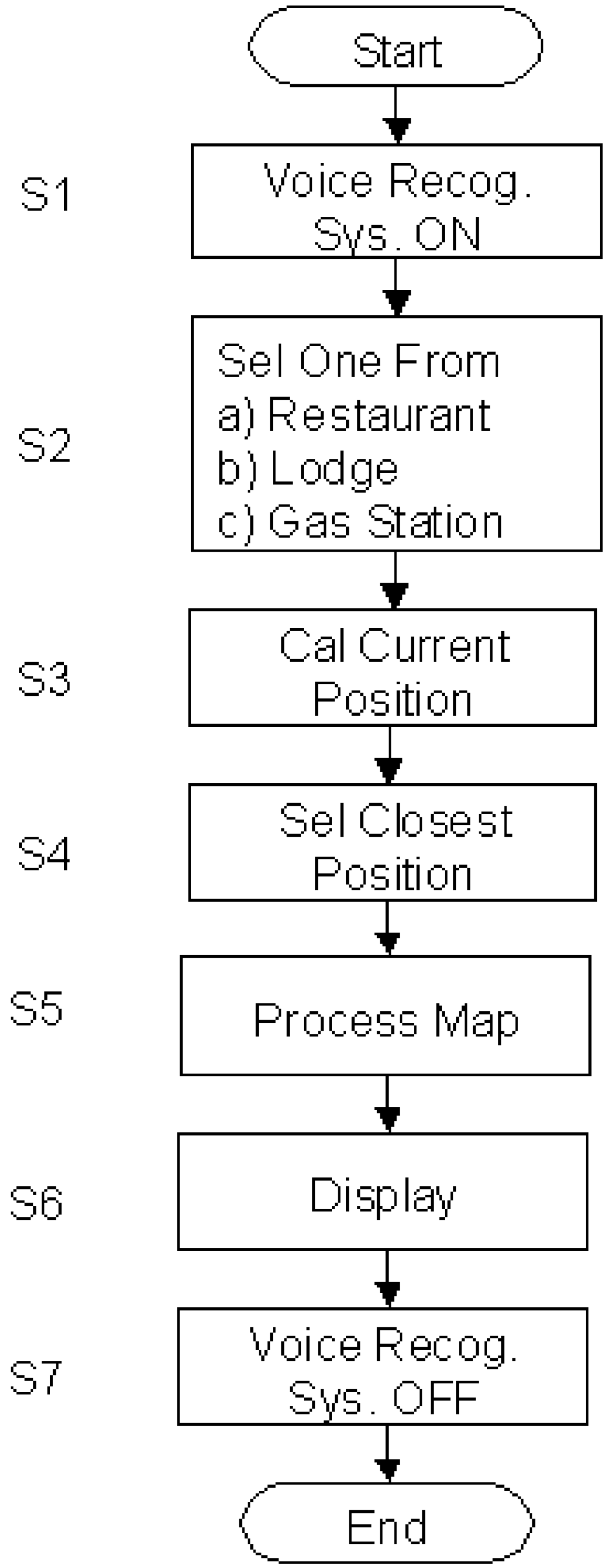
FIG. 72 is a flowchart illustrating an exemplary embodiment of the present invention.

FIG. 72 illustrates the method of finding the shortest location of the desired facility, such as restaurant, hotel, gas station, etc. The voice recognition system is activated in the manner described in FIG. 67 (S1). By way of utilizing the voice recognition system, a certain type of facility is selected from the options displayed on LCD 201 (FIG. 1). The prepared options can be a) restaurant, b) lodge, and c) gas station (S2). Once one of the options is selected, CPU 211 (FIG. 1) calculates and inputs the current position by the method described in FIG. 68 and/or FIG. 71 (S3). From the data selected in S2, CPU 211 scans Area 277 (FIG. 65) of RAM 206 and searches the location of the facilities of the selected category (such as restaurant) which is the closest to the current position (S4). CPU 211 then retrieves the relevant two-dimensional map data which should be displayed on LCD 201 from Area 275 of RAM 206 (FIG. 65) (S5). Instead, by way of utilizing the location data stored in 277 (FIG. 65), CPU 211 may produce a three-dimensional map by composing the three dimensional objects by method so-called 'texture mapping' which are stored in Area 276 (FIG. 65) of RAM 206. The two-dimensional map and/or the three dimensional map is displayed on LCD 201 (FIG. 1) (S6). The shortest route to the destination is re-highlighted by a significant color (such as red) to enable the user of Communication Device 200 to easily recognize the updated route on LCD 201. The voice recognition system is deactivated thereafter (S7).

Figure 73:
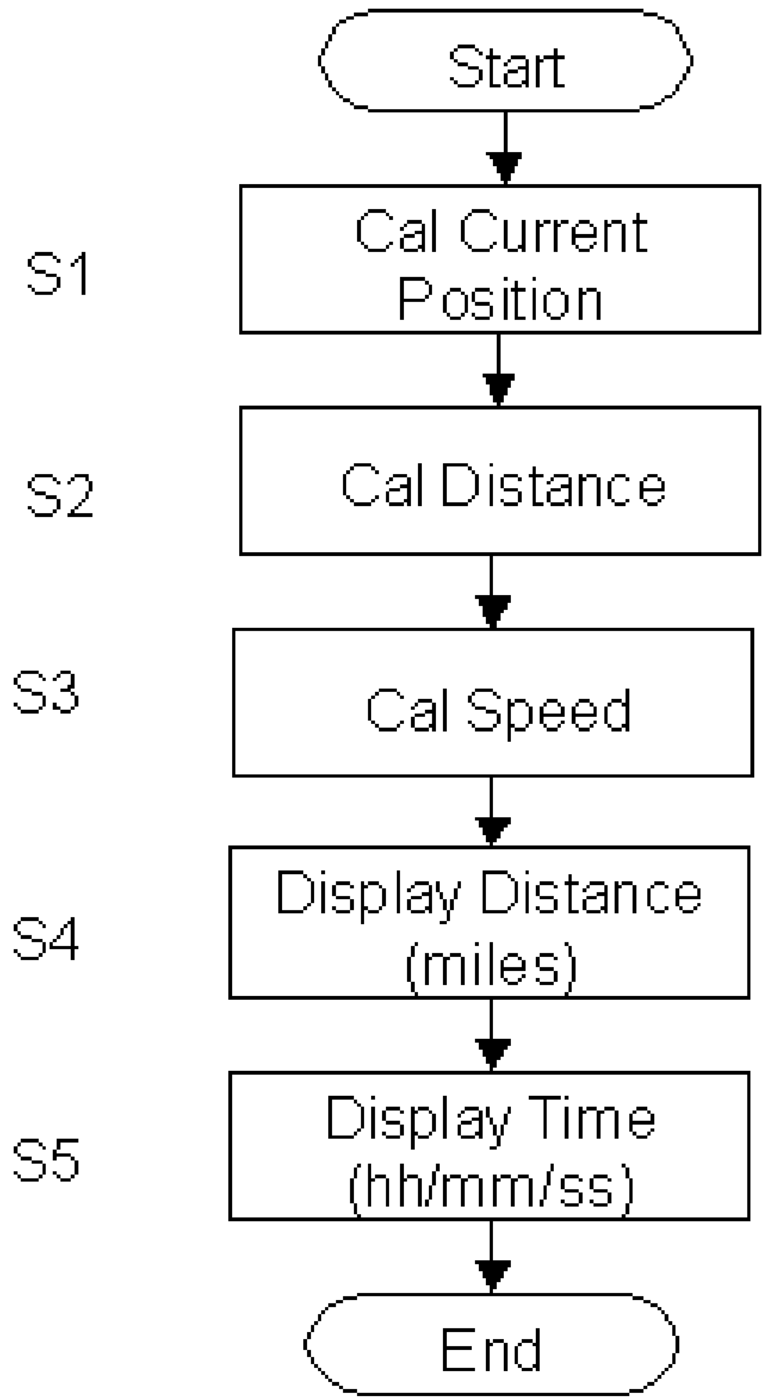
FIG. 73 is a flowchart illustrating an exemplary embodiment of the present invention.

FIG. 73 illustrates the method of displaying the time and distance to the destination. As illustrated in FIG. 73, CPU 211 (FIG. 1) calculates the current position wherein the source data can be input from the method described in FIG. 68 and/or FIG. 71 (S1). The distance is calculated from the method described in FIG. 70 (S2). The speed is calculated from the distance which Communication Device 200 has proceeded within specific period of time (S3). The distance to the destination and the time left are displayed on LCD 201 (FIG. 1) (S4 and S5).

Figure 74:
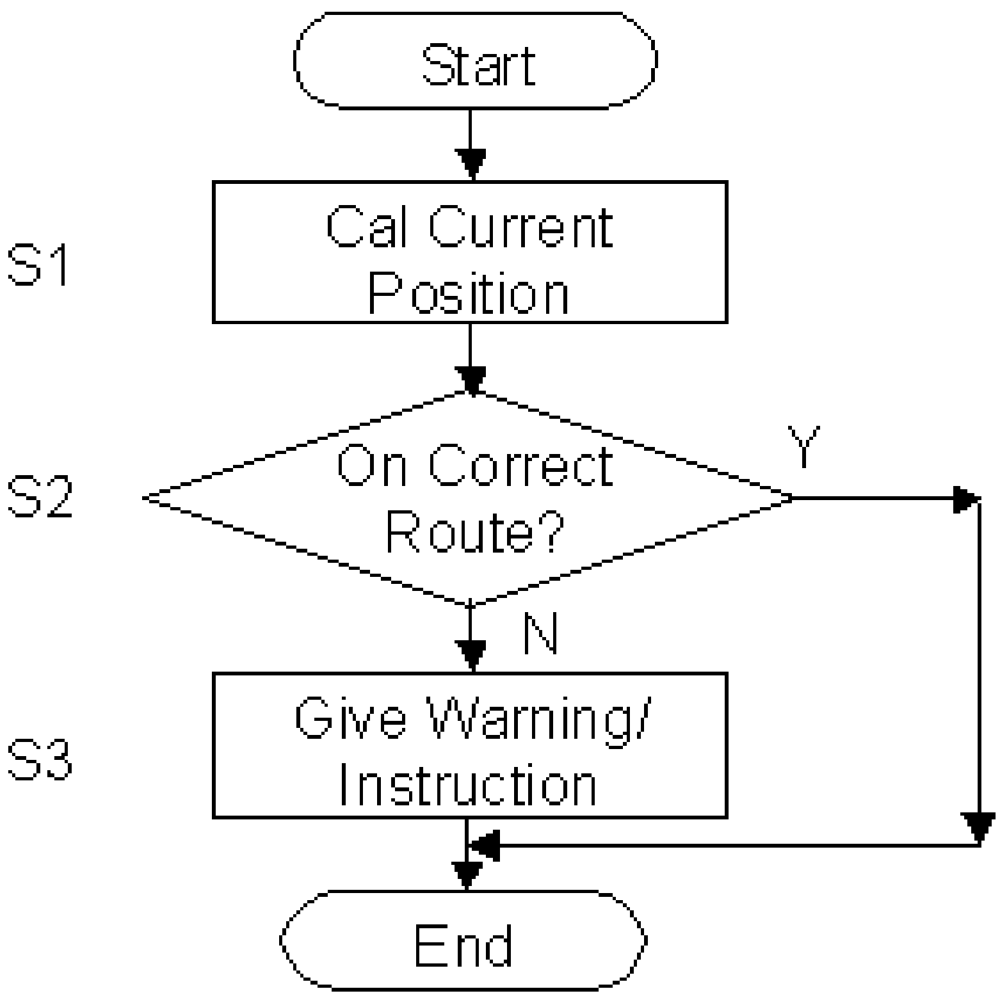
FIG. 74 is a flowchart illustrating an exemplary embodiment of the present invention.

FIG. 74 illustrates the method of warning and giving instructions when the user of Communication Device 200 deviates from the correct route. By way of periodically and automatically inputting the current position by the method so-called 'global positioning system' or 'GPS' as described hereinbefore, the current position is continuously updated (S1). If the current position deviates from the correct route (S2), a warning is given from Speaker 216 (FIG. 1) and/or on LCD 201 (FIG. 1) (S3). The method described in FIG. 74 is repeated for a certain period of time. If the deviation still exists after such period of time has passed, CPU 211 (FIG. 1) initiates the sequence described in FIG. 70 and calculates the shortest route to the destination and display it on LCD 201. The details of such sequence is as same as the one explained in FIG. 70.

Figure 74A:
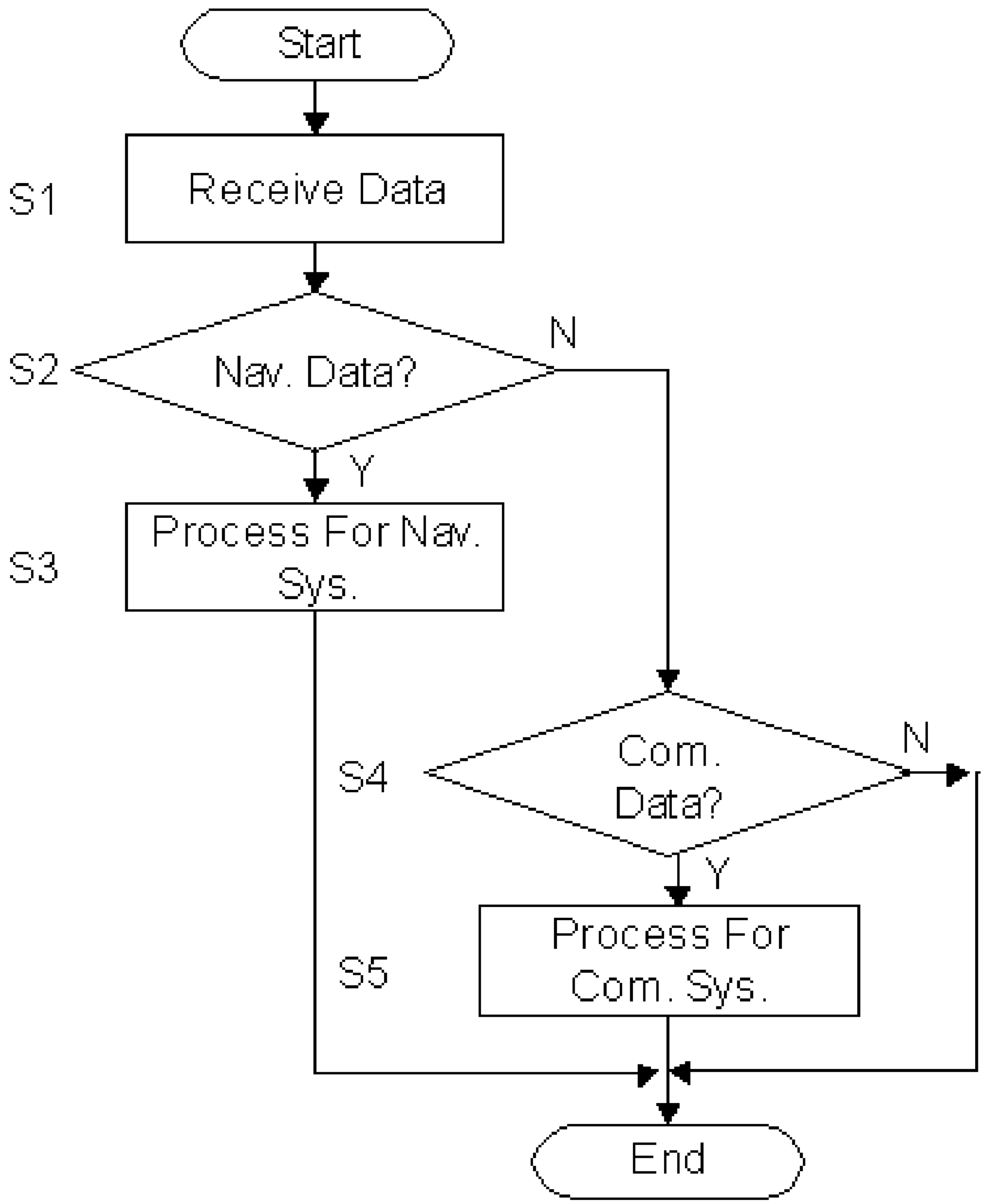
FIG. 74*a* is a flowchart illustrating an exemplary embodiment of the present invention.

FIG. 74*a* illustrates the overall operation of Communication Device 200 regarding the navigation system and the communication system. When Communication Device 200 receives data from Antenna 218 (FIG. 1) (S1), CPU 211 (FIG.

1) determines whether the data is navigation data, i.e., data necessary to operate the navigation system (S2). If the data received is a navigation data, the navigation system described in FIGS. 67 through 74 is performed (S3). On the other hand, if the data received is a communication data (S4), the communication system, i.e., the system necessary for wireless communication which is mainly described in FIG. 1 is performed (S5).

<<Navigation System—Summary>>

The foregoing inventions may be summarized as the following.

(1) A GPS navigation device comprising a display, a microphone, a GPS navigation system which identifies the present location of said GPS navigation device, and a voice recognition system which retrieves a text and numeric data from an analog audio input from said microphone wherein said analog audio is input to said microphone, said voice recognition system retrieves said text and numeric data from said analog audio, said text and numeric data is input to said GPS navigation system thereby enabling the user of said GPS navigation device to input necessary data therein without using his/her hands and/or without physically contacting said GPS navigation device and utilizing said GPS navigation system.

(2) A communication device comprising a GPS navigation system, a wireless communication system, and an antenna wherein said antenna receives navigation data which is necessary to operate said GPS navigation system, and said antenna also receives communication data which is necessary to operate said wireless communication system thereby enabling said communication device to be compact and also enabling the user of said communication device to find directions by utilizing said GPS navigation system as well as using said wireless communication system.

(3) A GPS navigation device comprising a display means, a navigation system which identifies the present location of said GPS navigation device, a storage means which stores a plurality of object data which is a three-dimensional data of object that is displayed on said display means and a plurality of location data which represents the location of said object wherein based on a specific information produced by said navigation system a specific location data is selected from said storage means, a plurality of said object data which corresponds to said location data is retrieved from said storage means, and said plurality of said object data is displayed on said display means in a manner the user of said GPS navigation device observes from the current location of said GPS navigation device thereby enables said user of said GPS navigation device to have a realistic view from said current location on said display means.

(4) A GPS navigation device comprising a display means, a navigation system which identifies the shortest route from a first location to a second location, a storage means which stores a plurality of location data which is categorized in one or more groups wherein when a certain group is selected, said navigation system retrieves a plurality of location data pertaining to said certain group, and identifies the shortest route to one of the location data pertaining to said certain group thereby enables the user of said GPS navigation device to take the shortest route from said user's present location to the location of said certain group.

(5) A GPS navigation device comprising a display means, a navigation system which identifies the shortest route from a first location to a second location, a storage means which stores a plurality of attribution data wherein said shortest route is calculated by referring to said plurality of attribution data thereby enabling the user of said GPS navigation device to reach said second location within shorter period time by way of avoiding road blocks, traffic accidents, road constructions, and traffic jams.

<<Remote Controlling System>>

FIGS. 75 through 83 illustrate the remote controlling system utilizing Communication Device 200 (FIG. 1).

Figure 75:
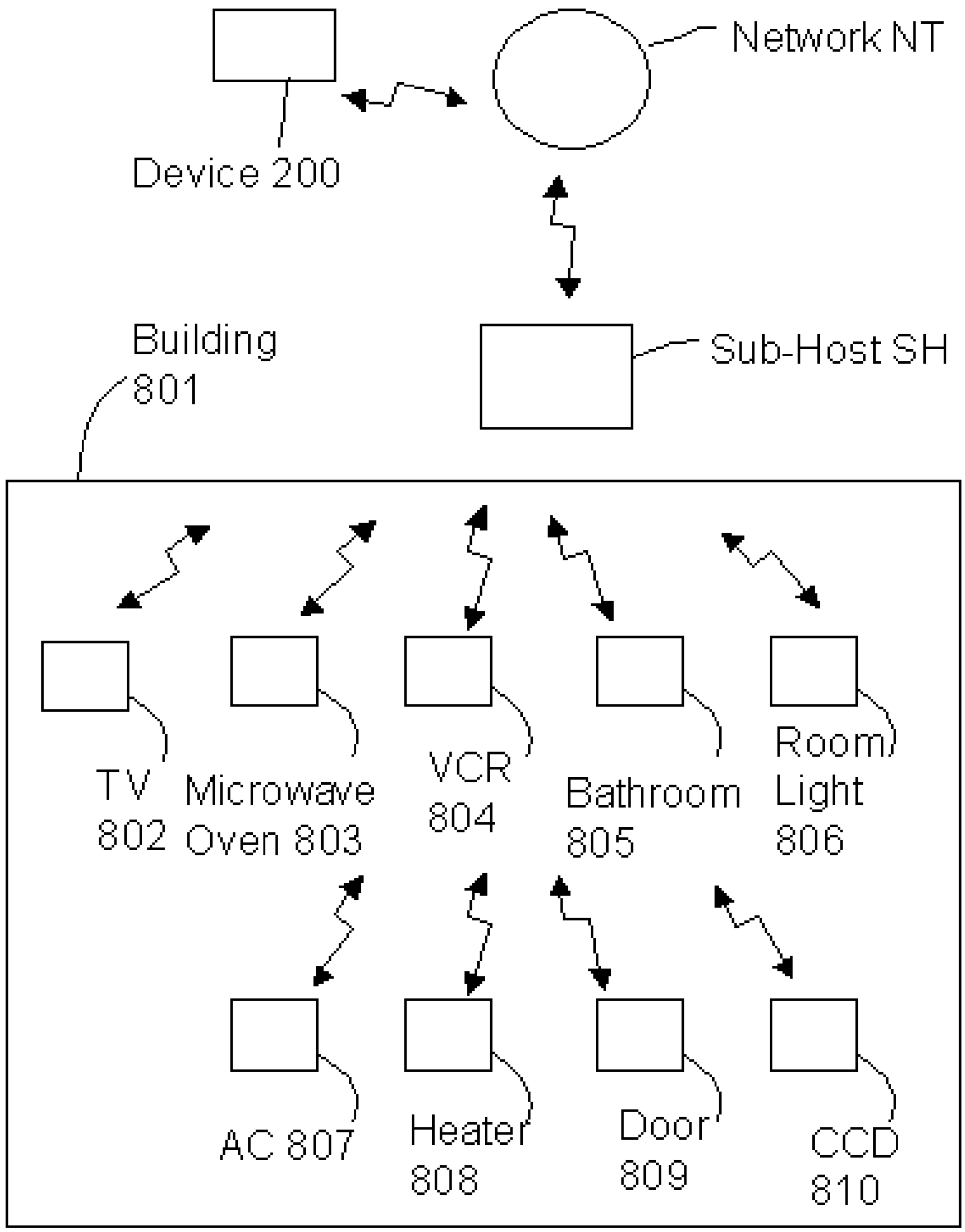
FIG. 75 is a simplified illustration illustrating an exemplary embodiment of the present invention.

As illustrated in FIG. 75, Communication Device 200 is connected to Network NT. Network NT may be the internet or have the same or similar structure described in FIG. 2*a*, FIG. 2*b* and/or FIG. 2*c* except 'Device B' is substituted to 'Sub-host SH' in these drawings. Network NT is connected to Sub-host SH in a wireless fashion. Sub-host SH administers various kinds of equipment installed in building 801, such as TV 802, Microwave Oven 803, VCR 804, Bathroom 805, Room Light 806, AC 807, Heater 808, Door 809, and CCD camera 810. Communication Device 200 transfers a control signal to Network NT in a wireless fashion via Antenna 218 (FIG. 1), and Network NT forwards the control signal in a wireless fashion to Sub-host SH, which controls the selected equipment based on the control signal. Communication device 200 is also capable to connect to Sub-host SH without going through Network NT and transfer directly the control signal to Sub-host SH in a wireless fashion via Antenna 218.

Figure 76:
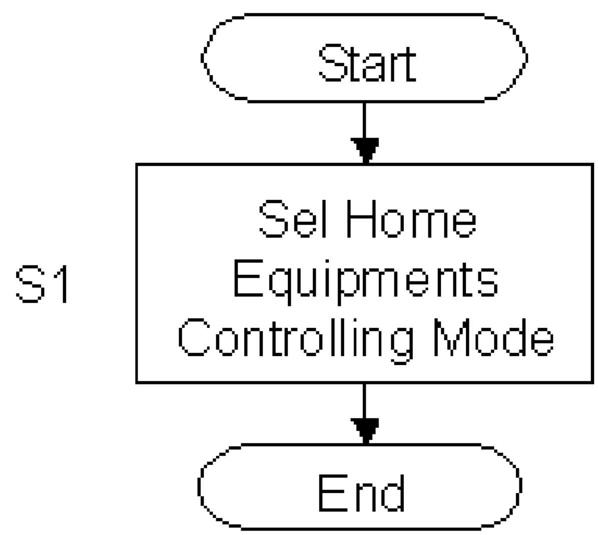
FIG. 76 is a flowchart illustrating an exemplary embodiment of the present invention.

As illustrated in FIG. 76, Communication Device 200 is enabled to perform the remote controlling system when the device is set to the home equipment controlling mode. Once Communication Device 200 is set to the home equipment controlling mode, LCD 201 (FIG. 1) displays all pieces of equipment which are remotely controllable by Communication Device 200. Each equipment can be controllable by the following method.

Figure 77:
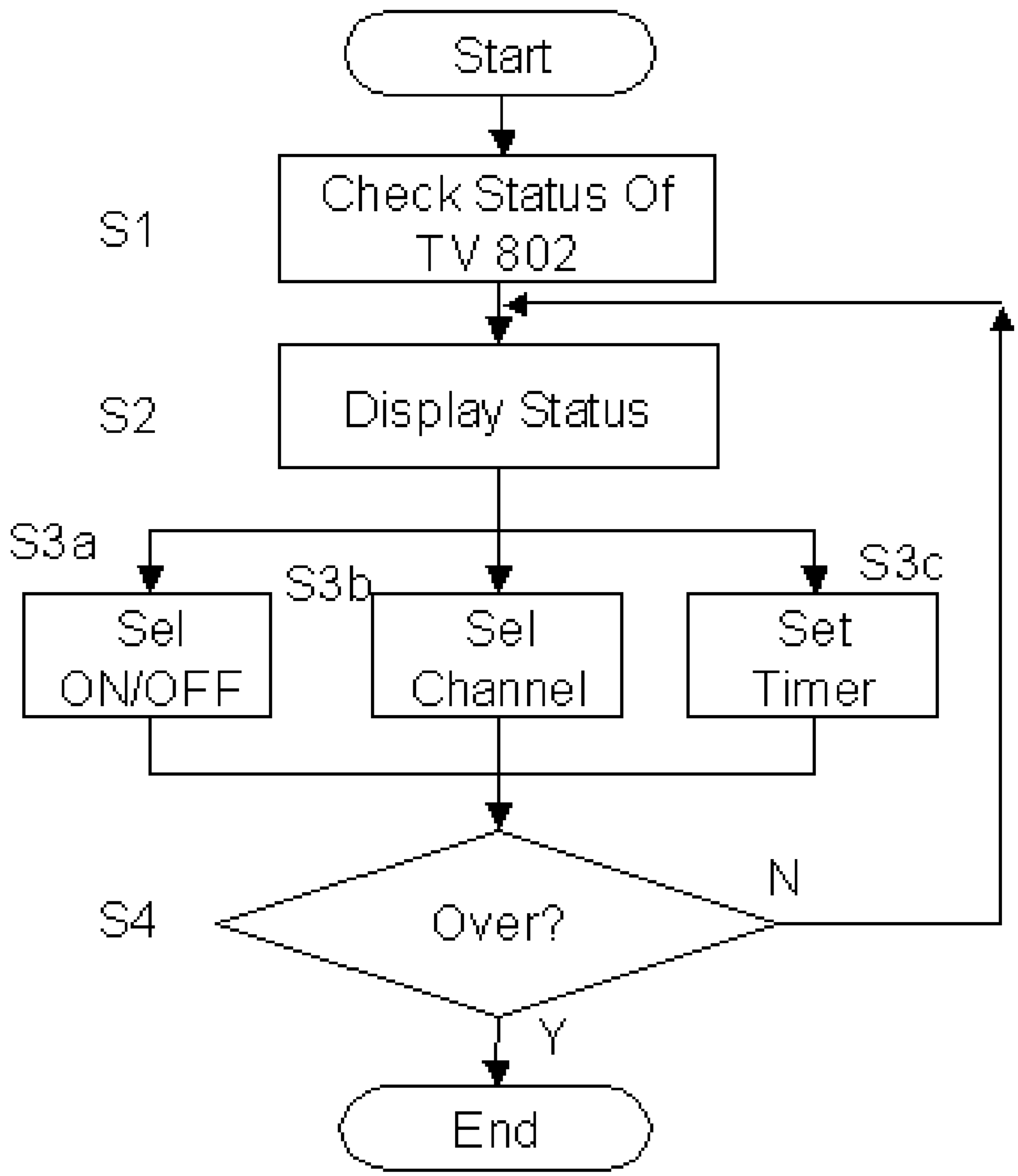
FIG. 77 is a flowchart illustrating an exemplary embodiment of the present invention.

FIG. 77 illustrates the method of remotely controlling TV 802. In order to check the status of TV 802, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of TV 802, i.e., the status of the power (ON/OFF), the channel, and the timer of TV 802 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the channel (S3*b*), and/or sets the timer of TV 802 (S3*c*). The sequence of S2 and S3 can be repeated (S4).

Figure 78:
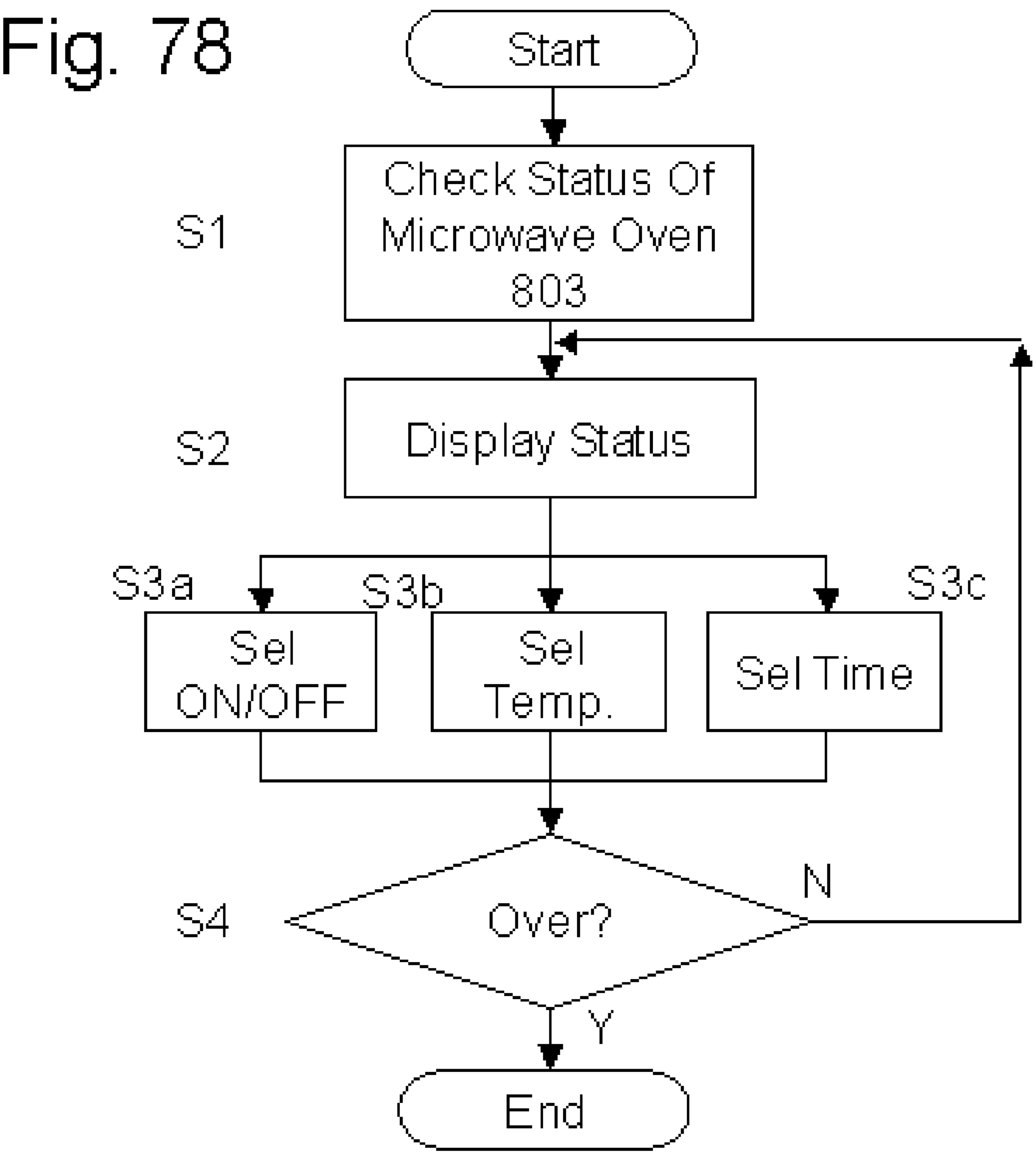
FIG. 78 is a flowchart illustrating an exemplary embodiment of the present invention.

FIG. 78 illustrates the method of remotely controlling Microwave Oven 803. In order to check the status of Microwave Oven 803, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Microwave Oven 803, i.e., the status of the power (ON/OFF), the status of temperature, and the timer of Microwave Oven 803 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the temperature (S3*b*), and/or sets the timer of Microwave Oven 803 (S3*c*). The sequence of S2 and S3 can be repeated (S4).

Figure 79:
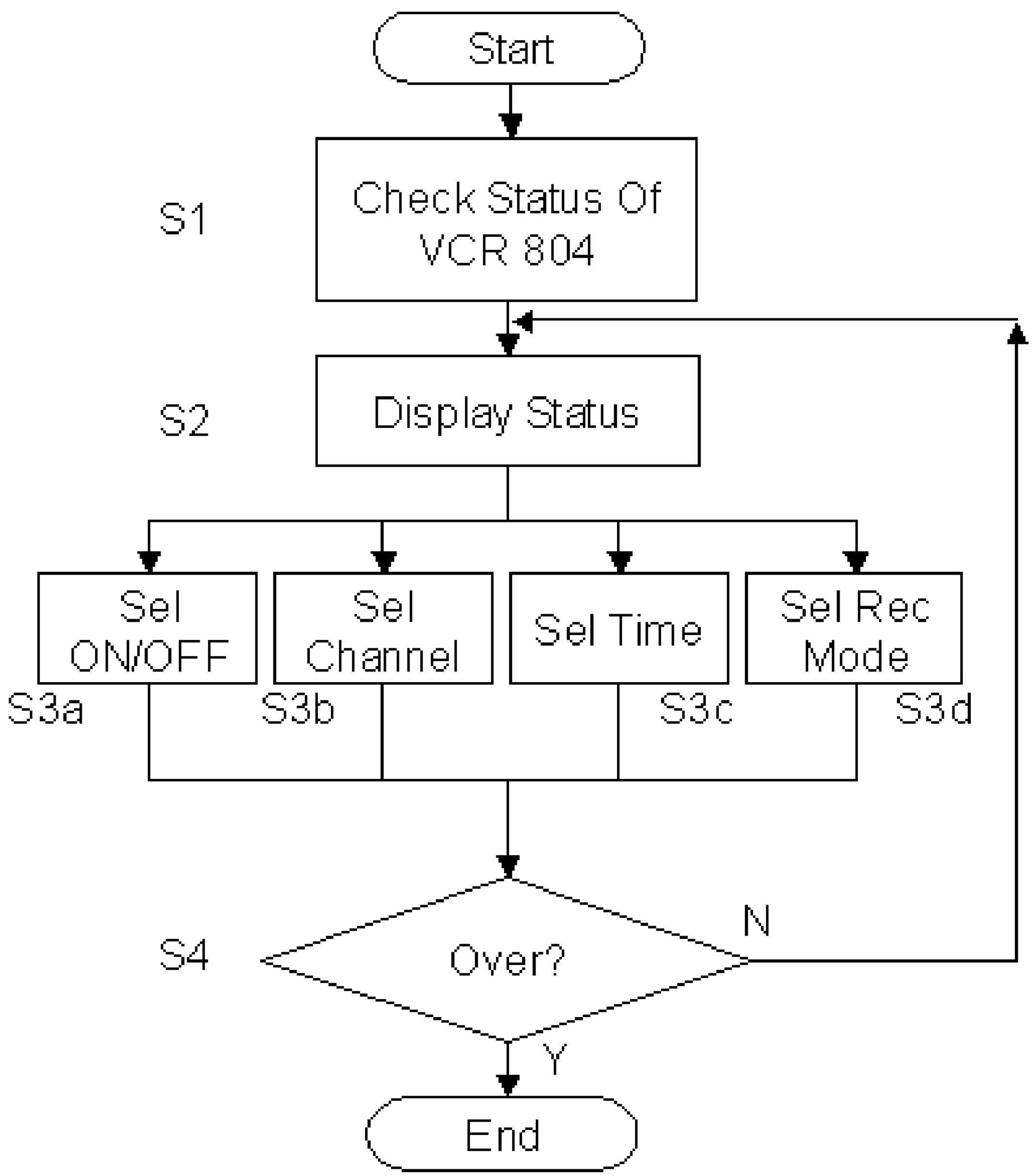
FIG. 79 is a flowchart illustrating an exemplary embodiment of the present invention.

FIG. 79 illustrates the method of remotely controlling VCR 804. In order to check the status of VCR 804, a specific signal is input from Input Device 210 (FIG. 1) or by the voice recognition system, and Communication Device 200 thereby sends a check request signal to Sub-host SH via Network NT.

Sub-host SH, upon receiving the check request signal, checks the status of VCR 804, i.e., the status of the power (ON/OFF), the channel, the timer, and the status of the recording mode (e.g., one day, weekdays, or weekly) of VCR 804 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the TV channel (S3*b*), sets the timer (S3*c*), and/or selects the recording mode of VCR 804 (S3*d*). The sequence of S2 and S3 can be repeated (S4).

Figure 80:
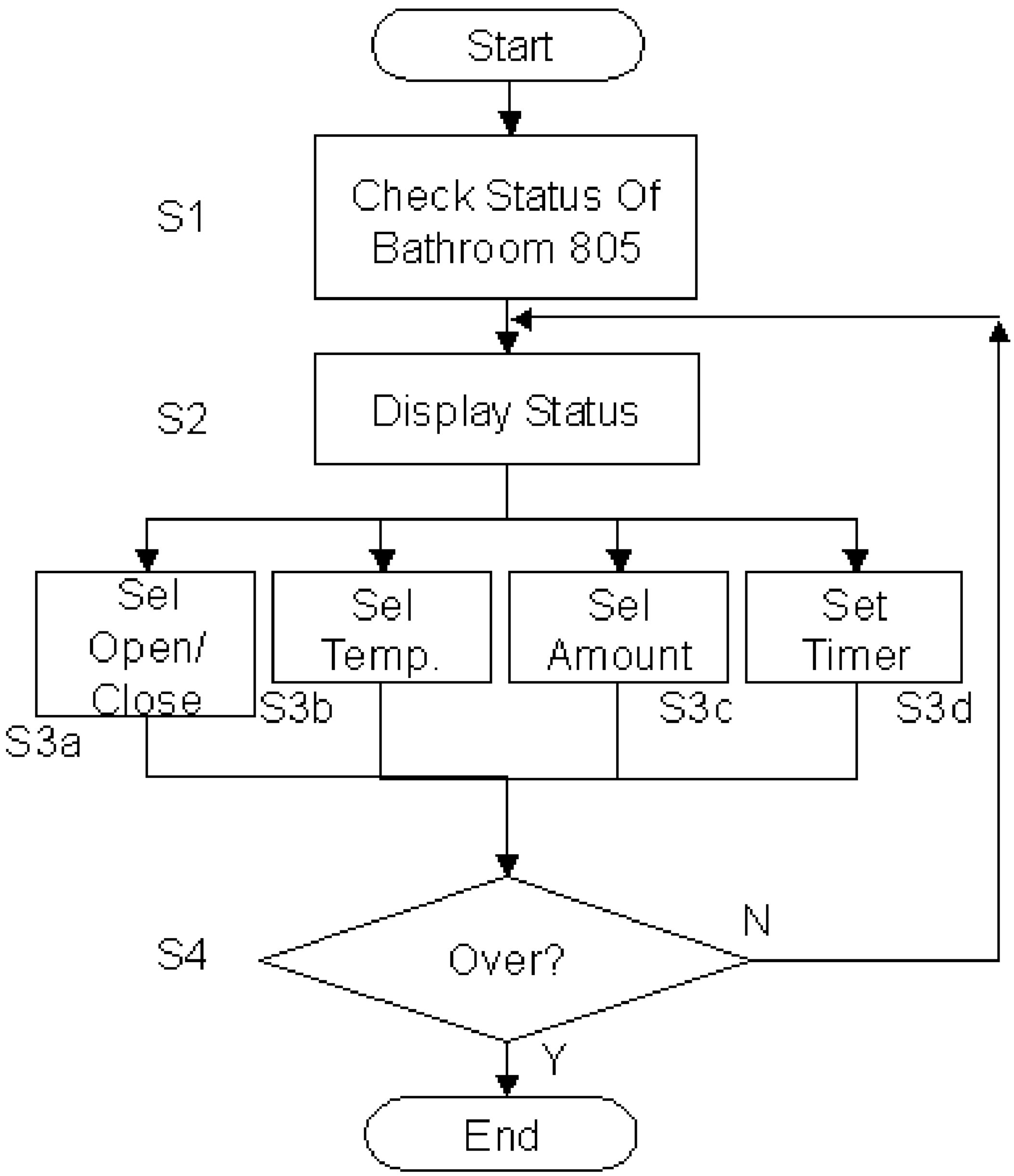
FIG. 80 is a flowchart illustrating an exemplary embodiment of the present invention.

FIG. 80 illustrates the method of remotely controlling Bathroom 805. In order to check the status of Bathroom 805, a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Bathroom 805, i.e., the status of the bath plug (or the stopper for bathtub) (OPEN/CLOSE), the temperature, the amount of hot water, and the timer of Bathroom 805 (S1), and returns the results to Communication Device 200 via Network NT, which are displayed on LCD 201 (FIG. 1) (S2). Based on the control signal produced by Communication Device 200, which is transferred via Network NT, Sub-host SH opens (or closes) the bath plug (S3*a*), selects the temperature (S3*b*), selects the amount of hot water (S3*c*), and/or sets the timer of Bathroom 805 (S3*d*). The sequence of S2 and S3 can be repeated (S4).

Figure 81:
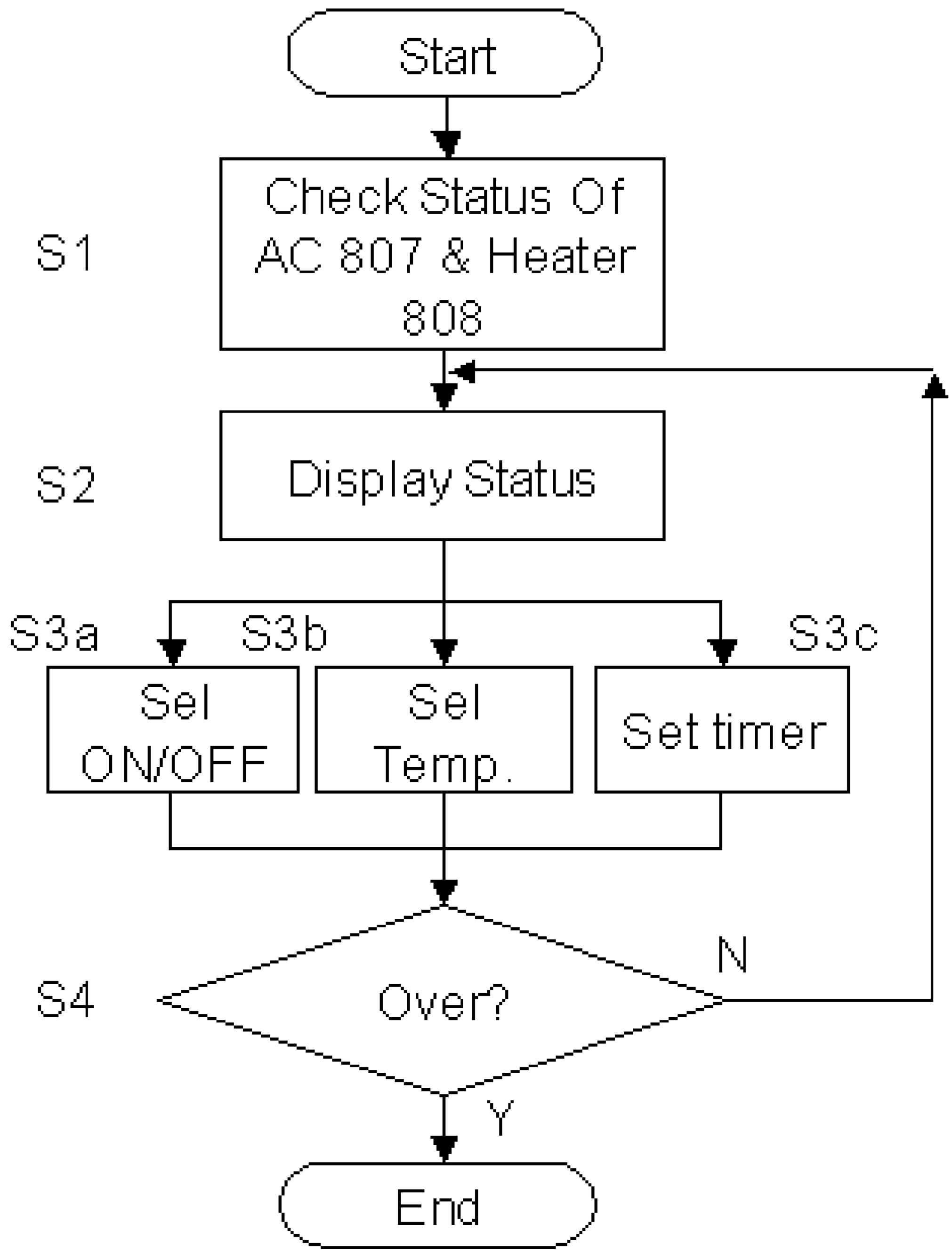
FIG. 81 is a flowchart illustrating an exemplary embodiment of the present invention.

FIG. 81 illustrates the method of remotely controlling AC 807 and Heater 808. In order to check the status of AC 807 and/or Heater 808 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of AC 807 and/or Heater 808, i.e., the status of the power (ON/OFF), the status of temperature, and the timer of AC 807 and/or Heater 808 (S1), and returns the results to Communication Device 200 via Network NT, which are displayed on LCD 201 (FIG. 1) (S2). Based on the control signal produced by Communication Device 200, which is transferred via Network NT, Sub-host SH turns the power on (or off) (S3*a*), selects the temperature (S3*b*), and/or sets the timer of AC 807 and/or Heater 808 (S3*c*). The sequence of S2 and S3 can be repeated (S4).

Figure 82:
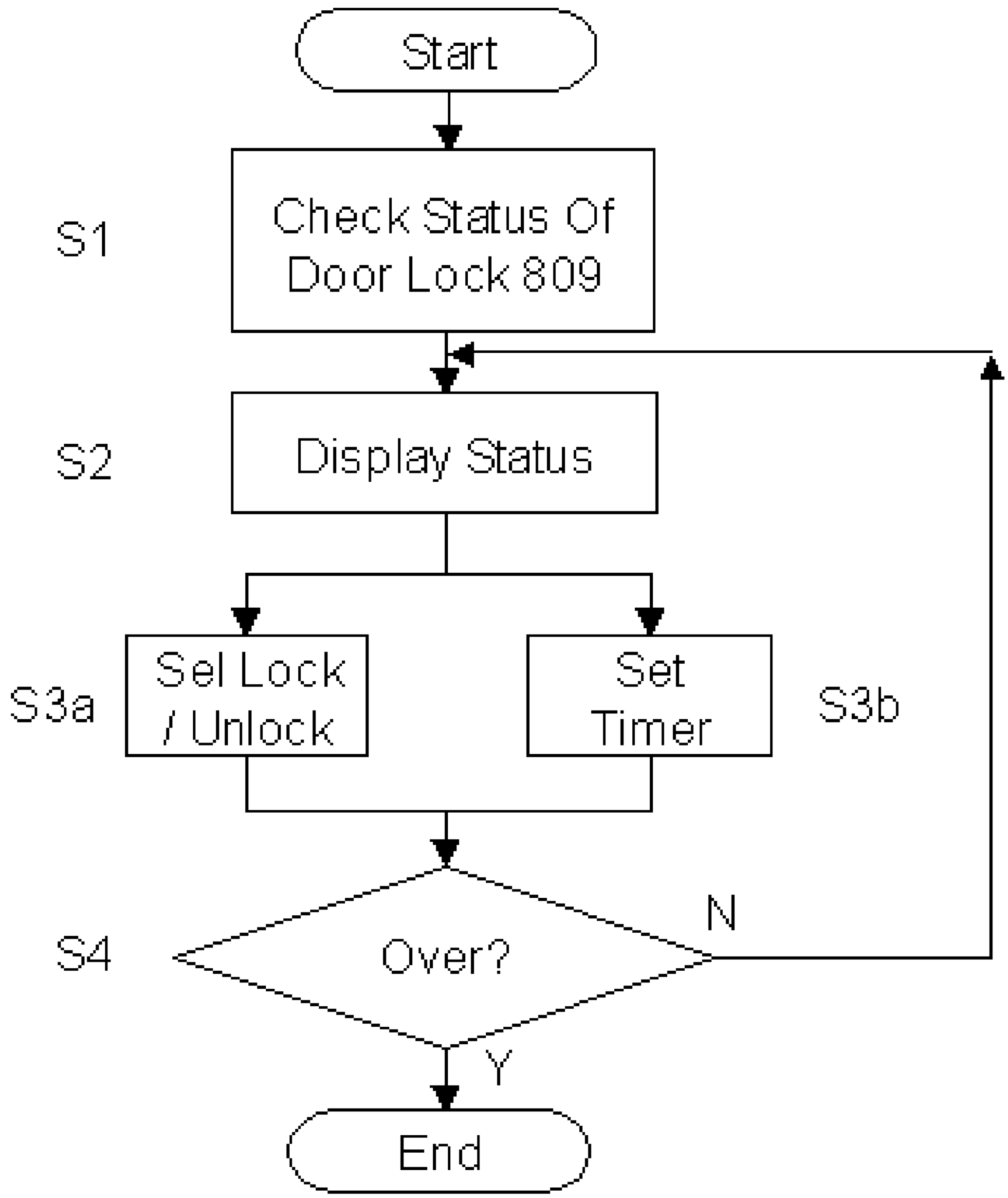
FIG. 82 is a flowchart illustrating an exemplary embodiment of the present invention.

FIG. 82 illustrates the method of remotely controlling Door 809. In order to check the status of Door 809 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of Door 809, i.e., the status of the door lock (LOCKED/UNLOCKED), and the timer of door lock (S1), and returns the results to Communication Device 200 via Network NT, which are displayed on LCD 201 (FIG. 1) (S2). Based on the control signal produced by Communication Device 200, which is transferred via Network NT, Sub-host SH locks (or unlocks) the door (S3*a*), and/or sets the timer of the door lock (S3*b*). The sequence of S2 and S3 can be repeated (S4).

Figure 83:
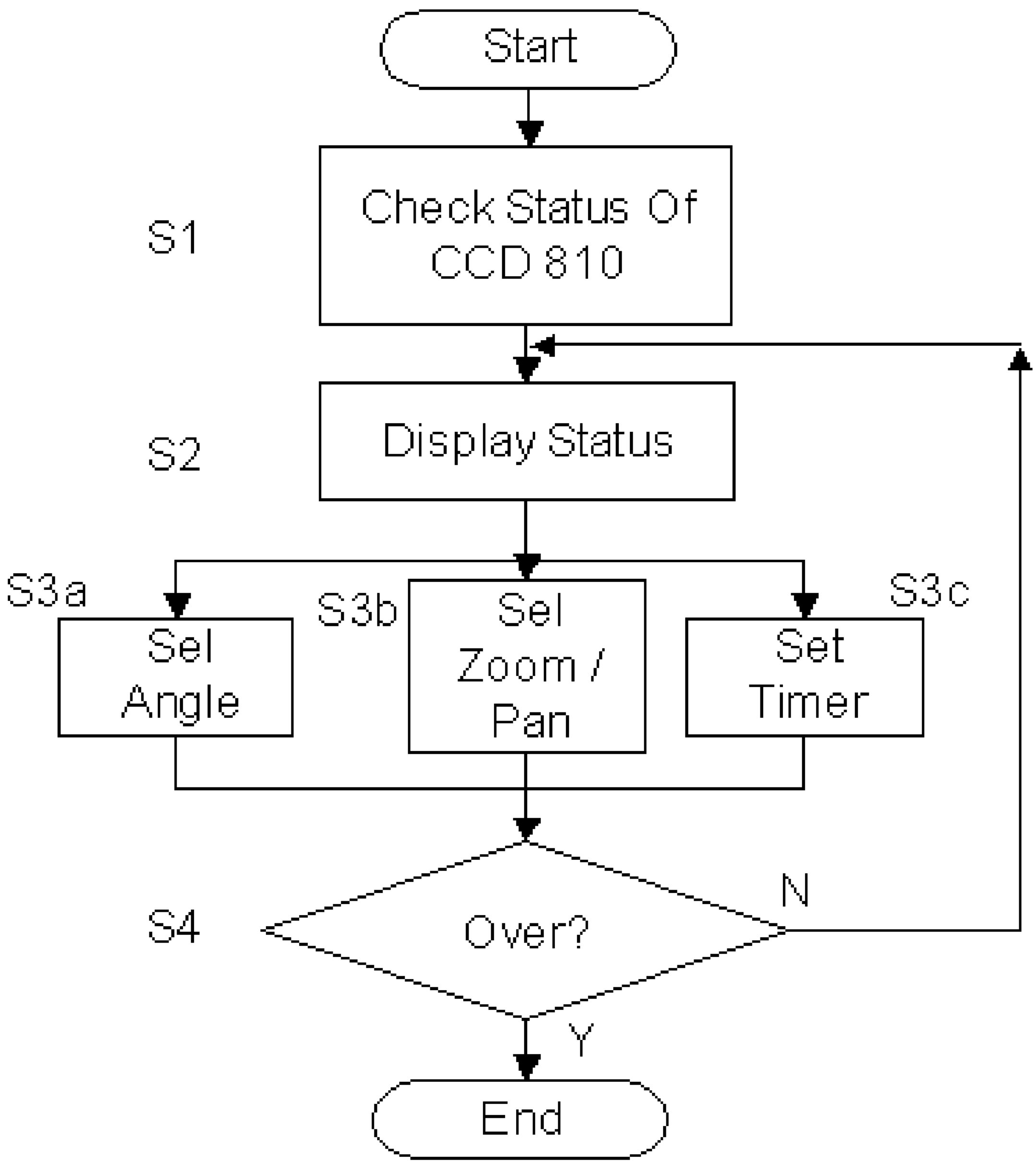
FIG. 83 is a flowchart illustrating an exemplary embodiment of the present invention.

FIG. 83 illustrates the method of CCD Camera 810. In order to check the status of CCD Camera 810 a specific signal is input from Input Device 210 (FIG. 1) or by the voice recognition system, and Communication Device 200 thereby sends a check request signal to Sub-host SH via Network NT. Sub-host SH, upon receiving the check request signal, checks the status of CCD Camera 810, i.e., the status of the camera angle, zoom and pan, and the timer of CCD Camera 810 (S1), and returns the results to Communication Device 200 via Network NT, which are displayed on LCD 201 (FIG. 1) (S2). Based on the control signal produced by Communication Device 200, which is transferred via Network NT, Sub-host SH selects the camera angle (S3*a*), selects zoom or pan (S3*b*), and/or sets the timer of CCD Camera 810 (S3*c*). The sequence of S2 and S3 can be repeated (S4).

Figure 84:
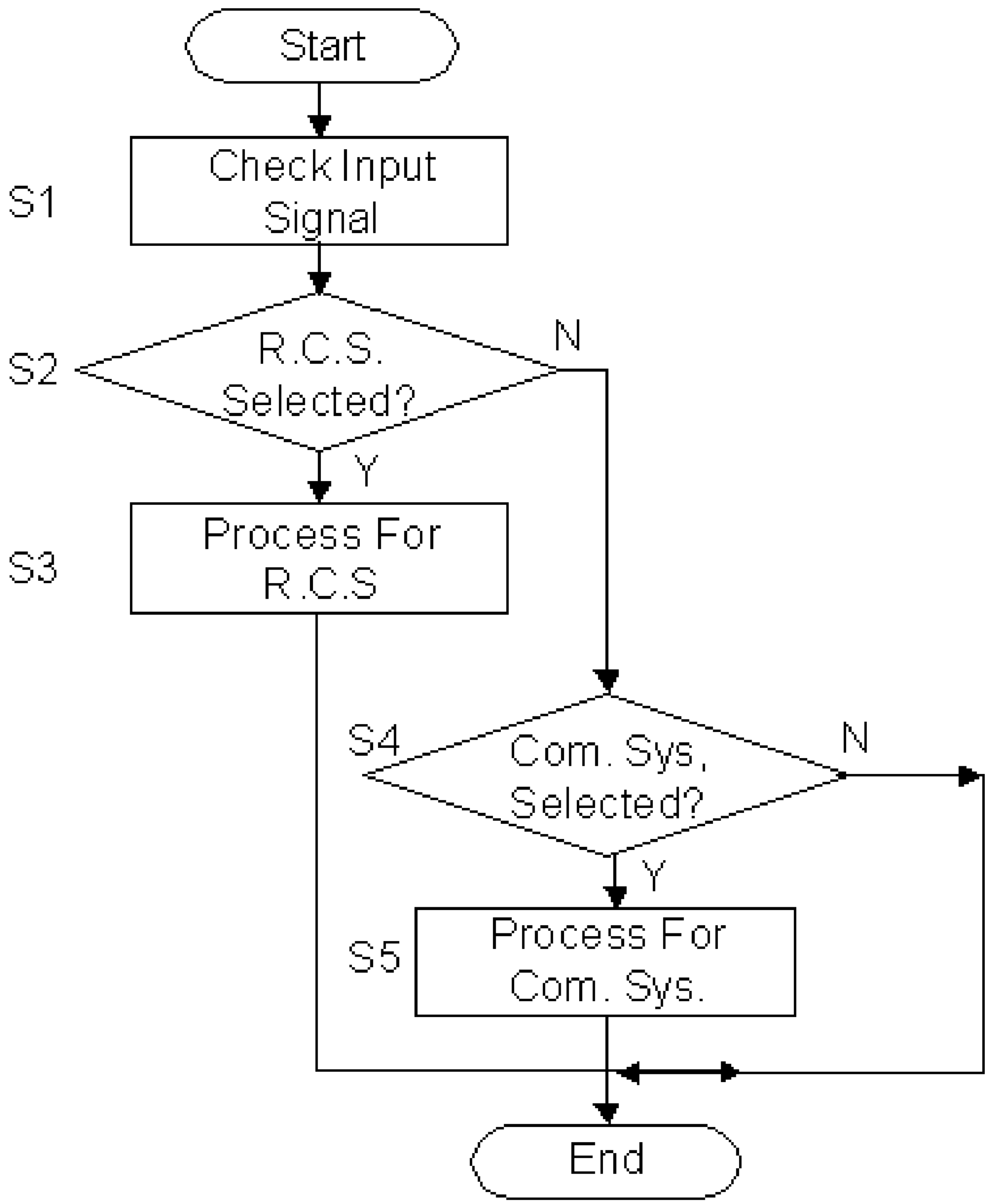
FIG. 84 is a flowchart illustrating an exemplary embodiment of the present invention.

FIG. 84 illustrates the overall operation of Communication Device 200 regarding the remote controlling system and communication system. CPU 211 (FIG. 1) periodically checks the input signal from Input Device 210 (FIG. 1) (S1). If the input signal indicates that the remote controlling system is selected (S2), CPU 211 initiates the process for the remote controlling system (S3). On the other hand, if the input signal indicates that the communication system is selected (S4), CPU 211 initiates the process for the communication system (S5).

Figure 85:
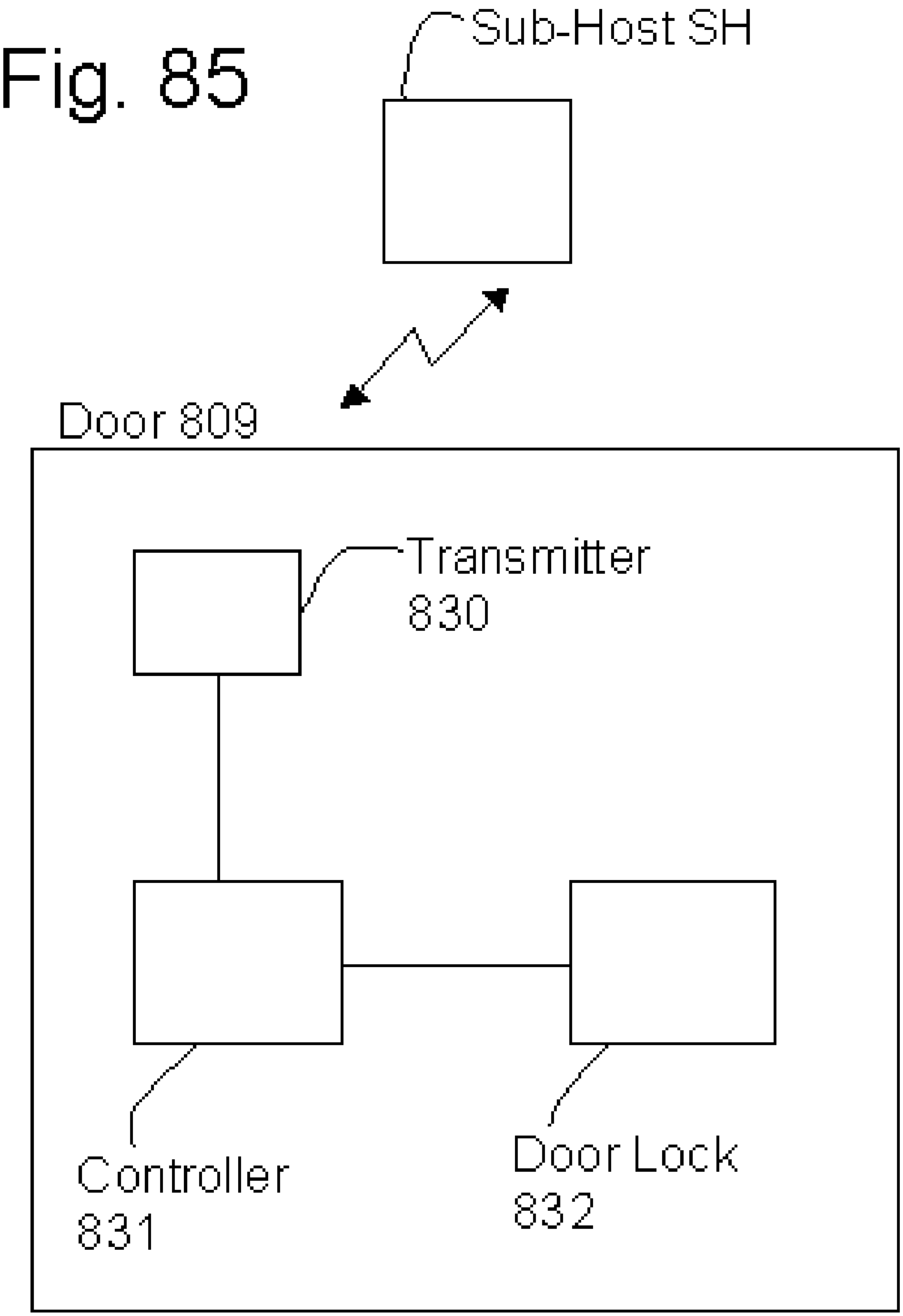
FIG. 85 is a block diagram illustrating an exemplary embodiment of the present invention.

FIG. 85 is a further description of the communication performed between Sub-host SH and Door 809 which is described in FIG. 82. When Sub-host SH receives a check request signal as described in FIG. 82, Sub-host SH sends a check status signal which is received by Controller 831 via Transmitter 830. Controller 831 checks the status of Door Lock 832 and sends back a response signal to Sub-host SH via Transmitter 830 in a wireless fashion indicating that Door Lock 832 is locked or unlocked. Upon receiving the response signal from Controller 832, Sub-host SH sends a result signal to Communication Device 200 in a wireless fashion as described in FIG. 82. When Sub-host SH receives a control signal from Communication Device 200 in a wireless fashion as described in FIG. 82, it sends a door control signal which is received by Controller 831 via Transmitter 830. Controller 831 locks or unlocks Door Lock 832 in conformity with the door control signal. As another embodiment of the present invention, Controller 831 may owe the task of both Sub-host SH and itself and communicate directly with Communication Device 200 via Network NT.

As another embodiment of the present invention each equipment, i.e., TV 802, Microwave Oven 803, VCR 804, Bathroom 805, Room Light 806, AC 807, Heater 808, Door Lock 809, and CCD Camera 810, may carry a computer which directly administers its own equipment and directly communicates with Communication Device 200 via Network NT instead of Sub-host SH administering all pieces of equipment and communicate with Communication Device 200.

The abovementioned invention is not limited to equipment installed in building 801 (FIG. 75), i.e., it is also applicable to the ones installed in all carriers in general, such as automobiles, airplanes, space shuttles, ships, motor cycles and trains.

<<Remote Controlling System—Summary>>

The foregoing inventions may be summarized as the following.

(1) A remote controlling system comprising a wireless communication device, an administration device which is capable of communicating with said communication device in a wireless fashion, a plurality of equipment which are subject to control of said administration device wherein said communication device sends a controlling signal to said administration device, said administration device controls said plurality of equipment in conformity with said control signal thereby enabling the user of said remote controlling system to remotely control one or more of said equipment in a wireless fashion from any location he/she desires and enabling said user to remotely control one or more said equipment as well as using said remote controlling system to communicate with other devices.

(2) A communication device comprising a remote controlling system which locks or unlocks a door, a wireless communication system, and an antenna wherein said antenna sends a door control signal which is necessary to lock or unlock said door, and said antenna also sends a communication signal which is necessary to operate said wireless communication system thereby enabling said communication device to be compact and also enabling the user of said communication device to lock or unlock said door as well as using said wireless communication system.

<<Auto Emergency Calling System>>

Figure 86:
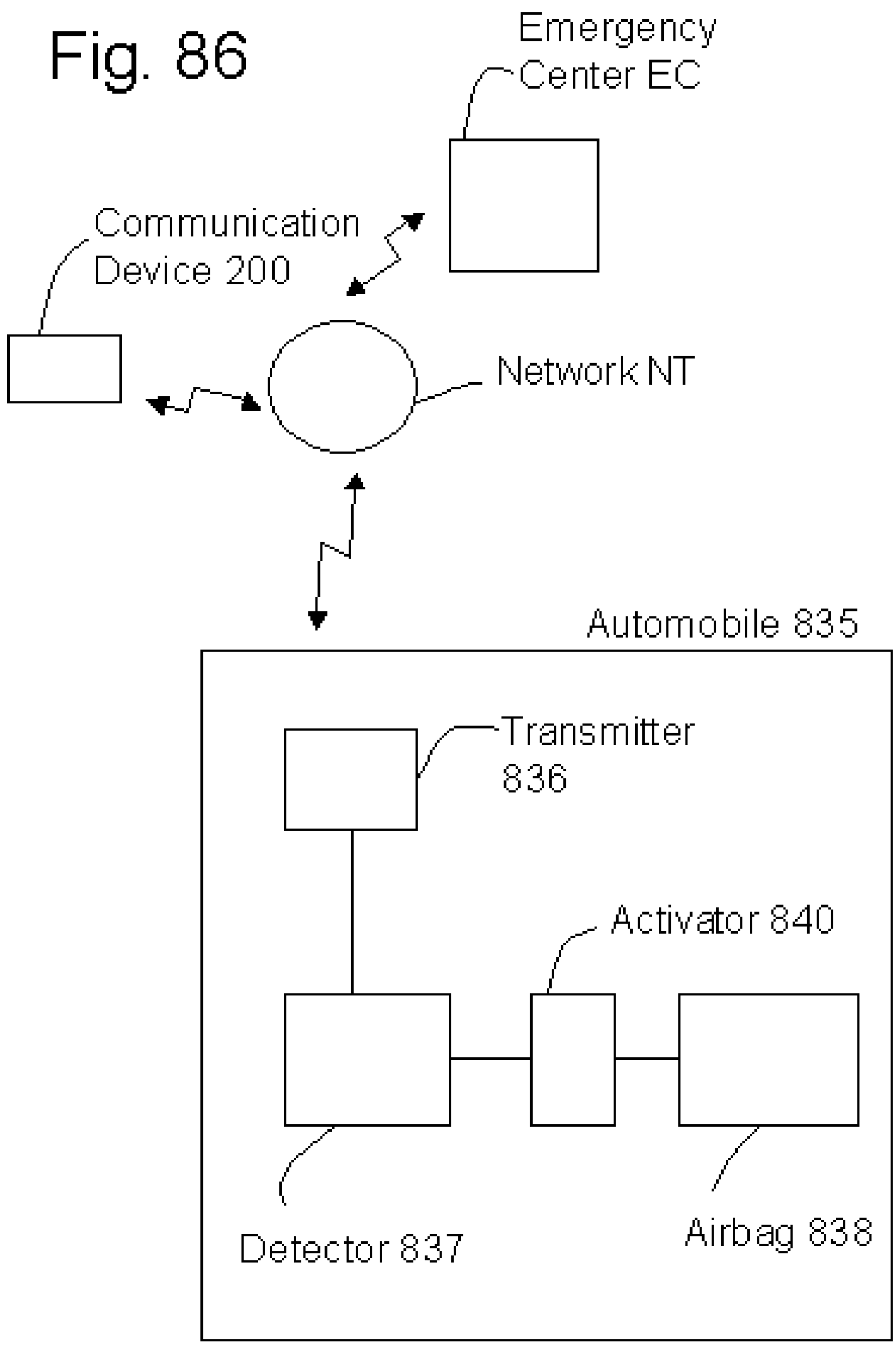
FIG. 86 is a simplified illustration illustrating an exemplary embodiment of the present invention.
Figure 87:
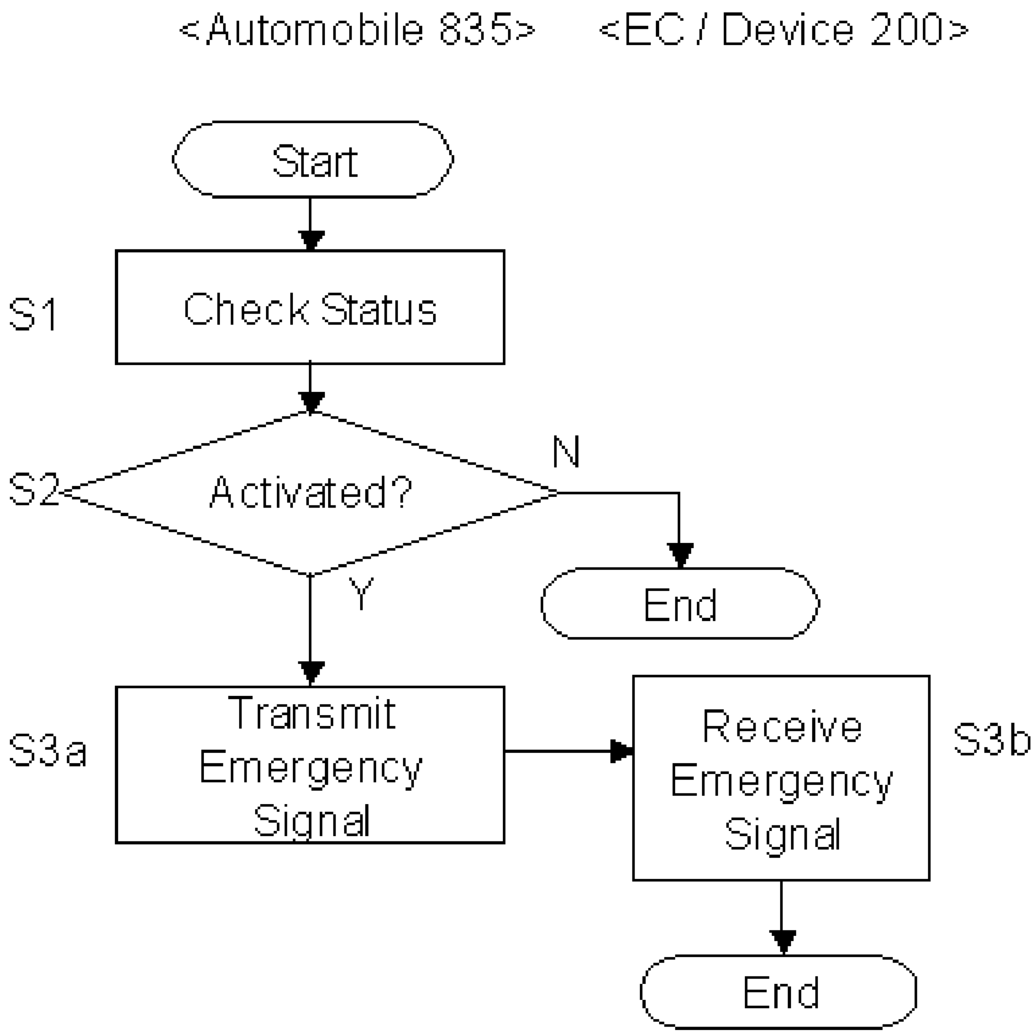
FIG. 87 is a flowchart illustrating an exemplary embodiment of the present invention.

FIGS. 86 and 87 illustrate the automatic emergency calling system utilizing Communication Device 200 (FIG. 1).

FIG. 86 illustrates the overall structure of the automatic emergency calling system. Communication Device 200 is connected to Network NT in a wireless fashion. Network NT may be the Internet or have the same or similar structure described in FIGS. 2*a*, and/or 2*c*. Network NT is connected to Automobile 835 thereby enabling Automobile 835 to communicate with Communication Device 200 in a wireless fashion. Emergency Center EC, a host computer, is also connected to Automobile 835 in a wireless fashion via Network NT. Airbag 838 which prevents persons in Automobile 835 from being physically injured or minimizes such injury in case traffic accidents occur is connected to Activator 840 which activates Airbag 838 when it detects an impact of more than certain level. Detector 837 sends an emergency signal via Transmitter 836 in a wireless fashion when Activator 840 is activated. The activation signal is sent to both Emergency Center EC and Communication Device 200. In lieu of Airbag 838 any equipment may be used so long as such equipment prevents from or minimizes physical injuries of the persons in Automobile 835.

FIG. 87 illustrates the overall process of the automatic emergency calling system. Detector 837 (FIG. 86) periodically checks the status of Activator 840 (FIG. 86) (S1). If the Activator 840 is activated (S2), Detector 837 transmits an emergency signal via Transmitter 836 in a wireless fashion (S3*a*). The emergency signal is transferred via Network NT and received by Emergency Center EC (FIG. 86) and by Communication Device 200 in a wireless fashion (S3*b*).

As another embodiment of the present invention, the power of Detector 837 (FIG. 86) may be usually turned off, and Activator 840 (FIG. 86) may turn on the power of Detector 837 by the activation of Activator 840 thereby enabling Detector 837 to send the emergency signal to both Emergency Center EC (FIG. 86) and to Communication Device 200 as described above.

This invention is also applicable to any carriers including airplanes, space shuttles, ships, motor cycles and trains.

<<Auto Emergency Calling System—Summary>>

The foregoing invention may be summarized as the following.

An automatic emergency calling system comprising a carrier, a network and a host wherein said carrier consists of a physical injury prevention means which prevents persons in said carrier from being physically injured or minimizes such injury, a detector which sends an emergency signal, said detector sends said emergency signal when said physical injury prevention means is activated, said emergency signal is received by said host via said network thereby enabling to minimize the duration of time of said persons to be rescued.

<<Cellular TV Function>>

FIGS. 88 through 135 illustrate the cellular TV function of the Communication Device 200 (FIG. 1).

Figure 88:
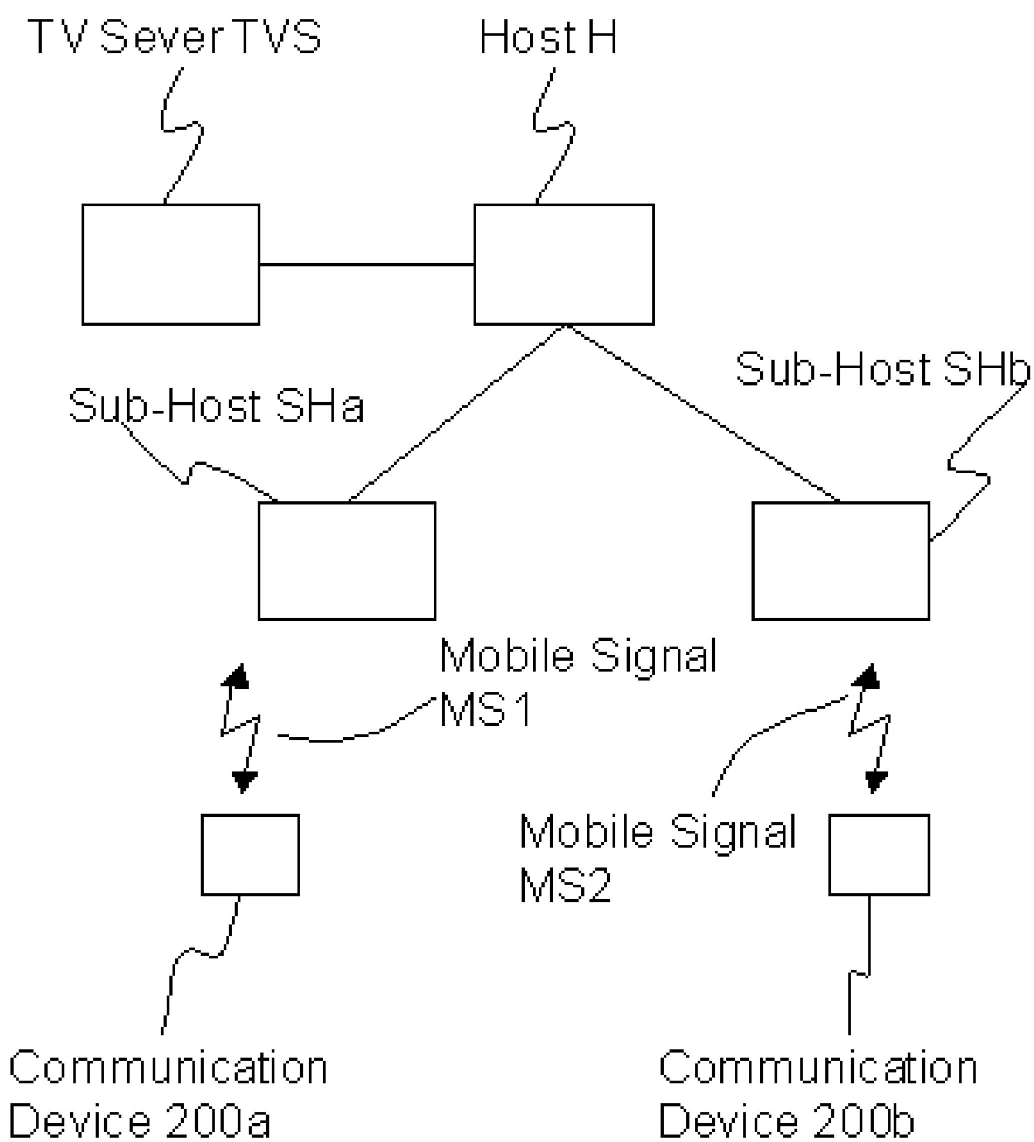
FIG. 88 is a simplified illustration illustrating an exemplary embodiment of the present invention.

As described in FIG. 88, the cellular TV function of the Communication Device 200 (FIG. 1) is exploited by the combination of TV Server TVS, Host H, Sub-host SHa, Sub-host SHb, Communication Device 200*a*, and Communication Device 200*b*. TV Server TVS is electronically linked to Host H, which is also electronically linked to Sub-hosts SHa and SHb. Sub-hosts SHa and SHb are linked to Communication Devices 200*a* and 200*b* in a wireless fashion. TV Server TVS stores a plurality of channel data, which are explained in details in FIG. 90 hereinafter. A plurality of channel data are transferred from TV Server TVS to Host H, which distributes such data to Sub-hosts SHa and SHb. Sub-hosts SHa and SHb transfers the plurality of channel data to Communication Devices 200*a* and 200*b* respectively via Mobile Signal MS1, i.e., a plurality of wireless signal which enables Communication Devices 200*a* and 200*b* to communicate with Sub-hosts SHa and SHb respectively in a wireless fashion, thereby enables to display the channel data on LCD 201 (FIG. 1) installed on each of Communication Devices 200*a* and 200*b*.

Figure 89:
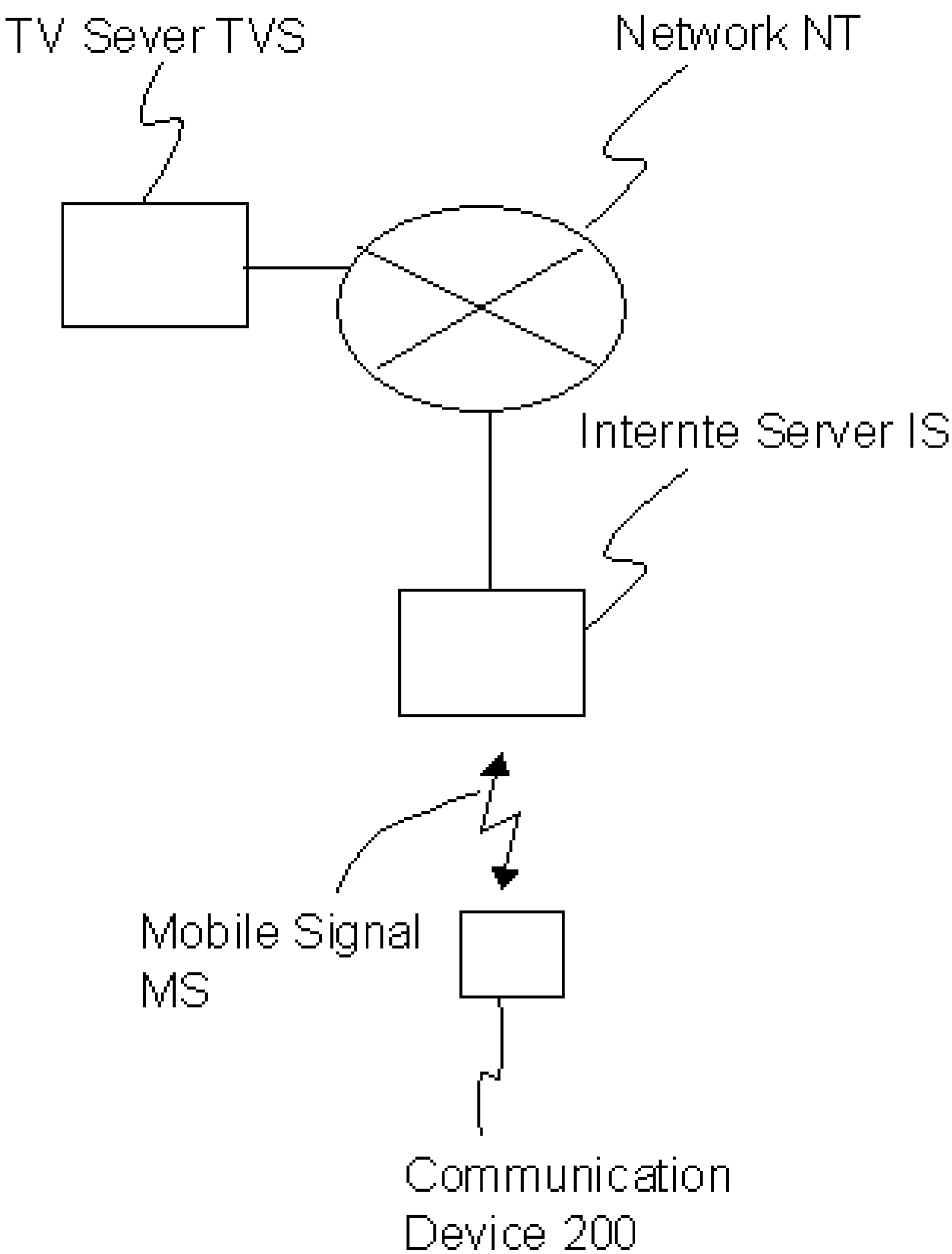
FIG. 89 is a simplified illustration illustrating an exemplary embodiment of the present invention.

FIG. 89 illustrates another embodiment of the cellular TV function of Communication Device 200 (FIG. 1), which utilizes a network. TV Server TVS is electronically linked to Internet Server IS via Network NT, such as the Internet. Internet Server IS is linked to Communication Device 200 in a wireless fashion. A plurality of channel data are distributed from TV Server TVS to Internet Server IS via network NT, which transfers such data to Communication Device 200 via Mobile Signal MS, i.e., a plurality of wireless signal which enables Communication Device 200 to communicate with Internet Server IS in a wireless fashion.

Figure 90:
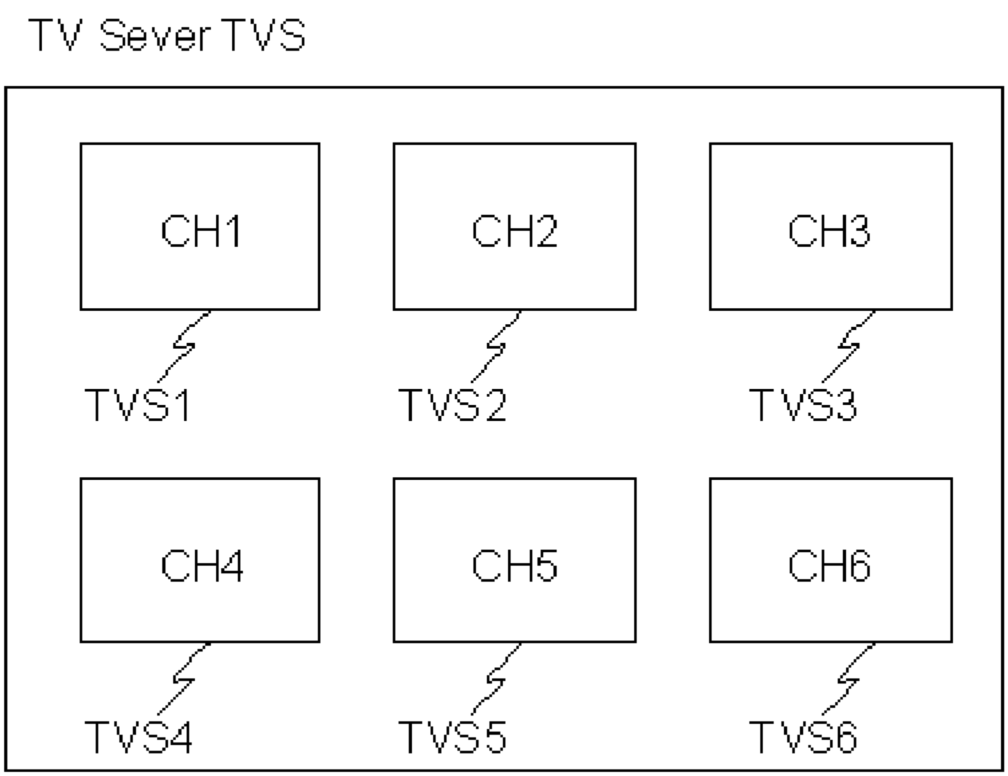
FIG. 90 is a block diagram illustrating an exemplary embodiment of the present invention.

FIG. 90 illustrates the data stored in TV Server TVS (FIGS. 88 and 89). In the example shown in FIG. 90, six kinds of channel data are stored. Namely, the channel data regarding Channel 1 is stored in Area TVS1, the channel data regarding Channel 2 is stored in Area TVS2, the channel data regarding Channel 3 is stored in Area TVS3, the channel data regarding Channel 4 is stored in Area TVS4, the channel data regarding Channel 5 is stored in Area TVS5, and the channel data regarding Channel 6 is stored in Area TVS6. Here, each channel data represents a specific TV program, i.e., each channel data is primarily composed of a series of motion picture data and a series of subtitle data which are designed to be displayed on LCD 201 (FIG. 1) and a series of audio data which are designed to be output from Speaker 216 (FIG. 1).

Figure 91:
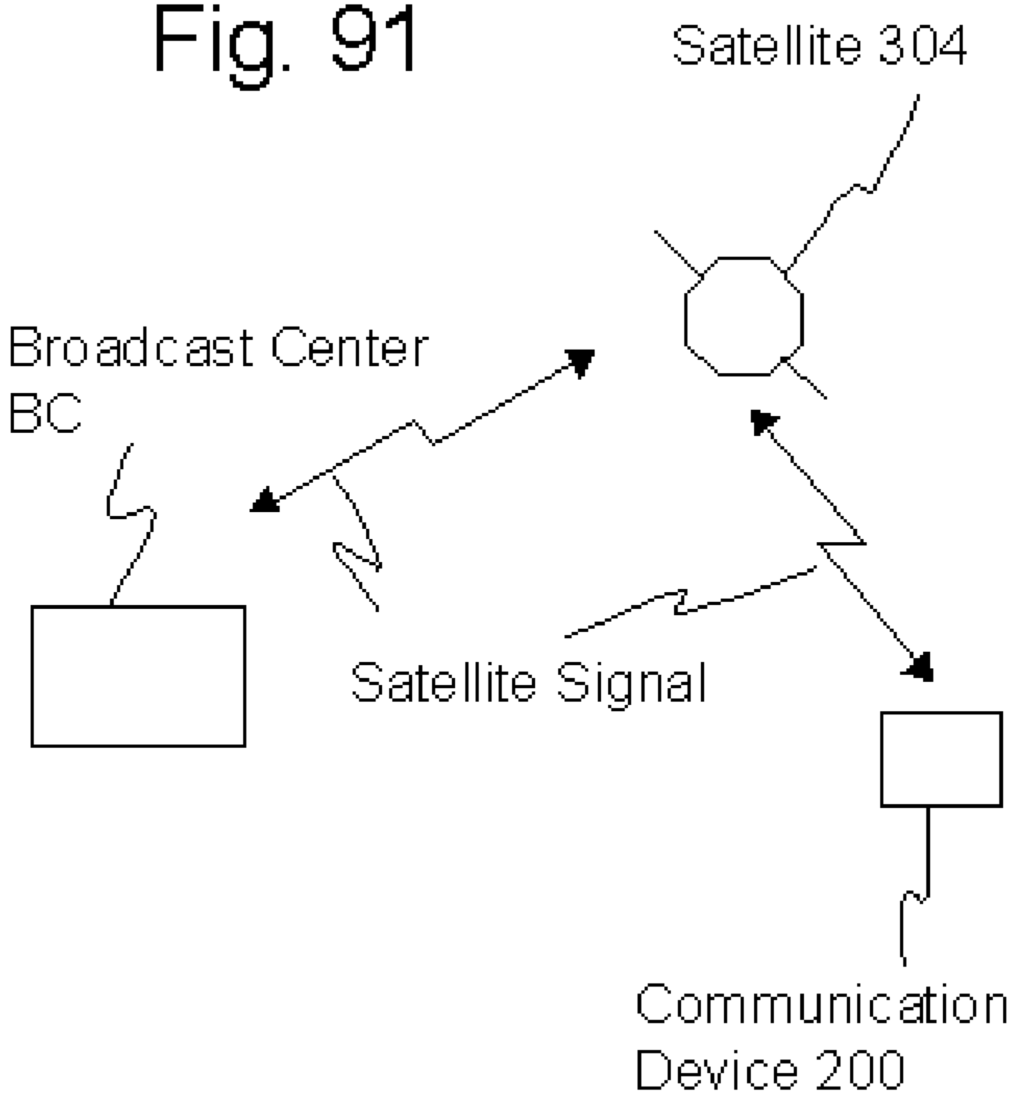
FIG. 91 is a simplified illustration illustrating an exemplary embodiment of the present invention.

Communication Device 200 (FIG. 1) has the capability to display satellite TV programs as illustrated in FIG. 91. Broadcast center BC distributes a plurality of Satellite Signal SS to Satellite 304, which transfers the same series of signals to Communication Device 200, both of which in a wireless fashion. A plurality of Satellite Signal SS include a plurality of channel data.

Figure 92:
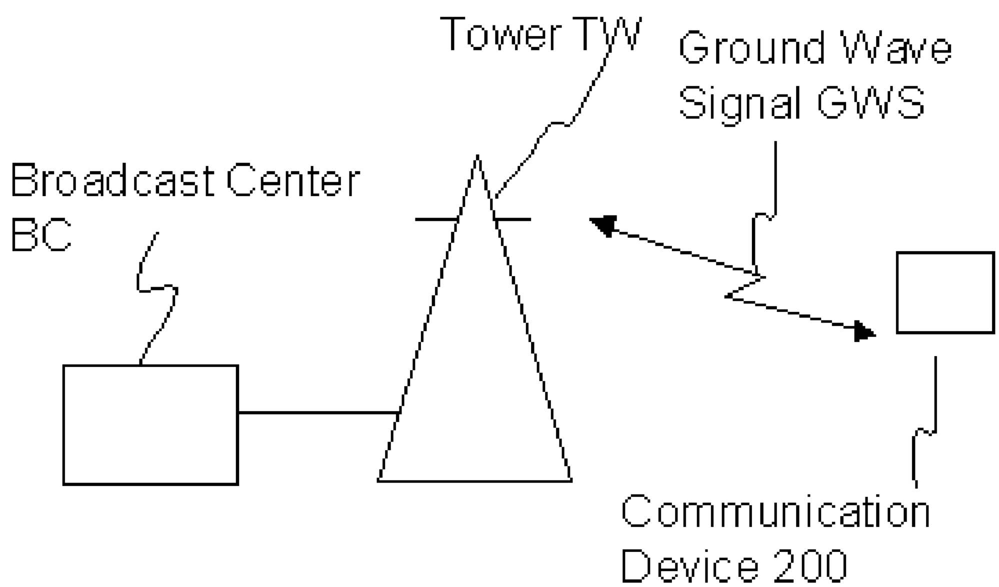
FIG. 92 is a simplified illustration illustrating an exemplary embodiment of the present invention.

Communication Device 200 (FIG. 1) also has the capability to display ground wave TV programs as illustrated in FIG. 92. Broadcast Center BC distributes a plurality of channel data to Tower TW via a fixed cable, which transfers the plurality of channel data via ground wave, i.e., Ground Wave Signal GWS to Communication Device 200.

Figure 93:
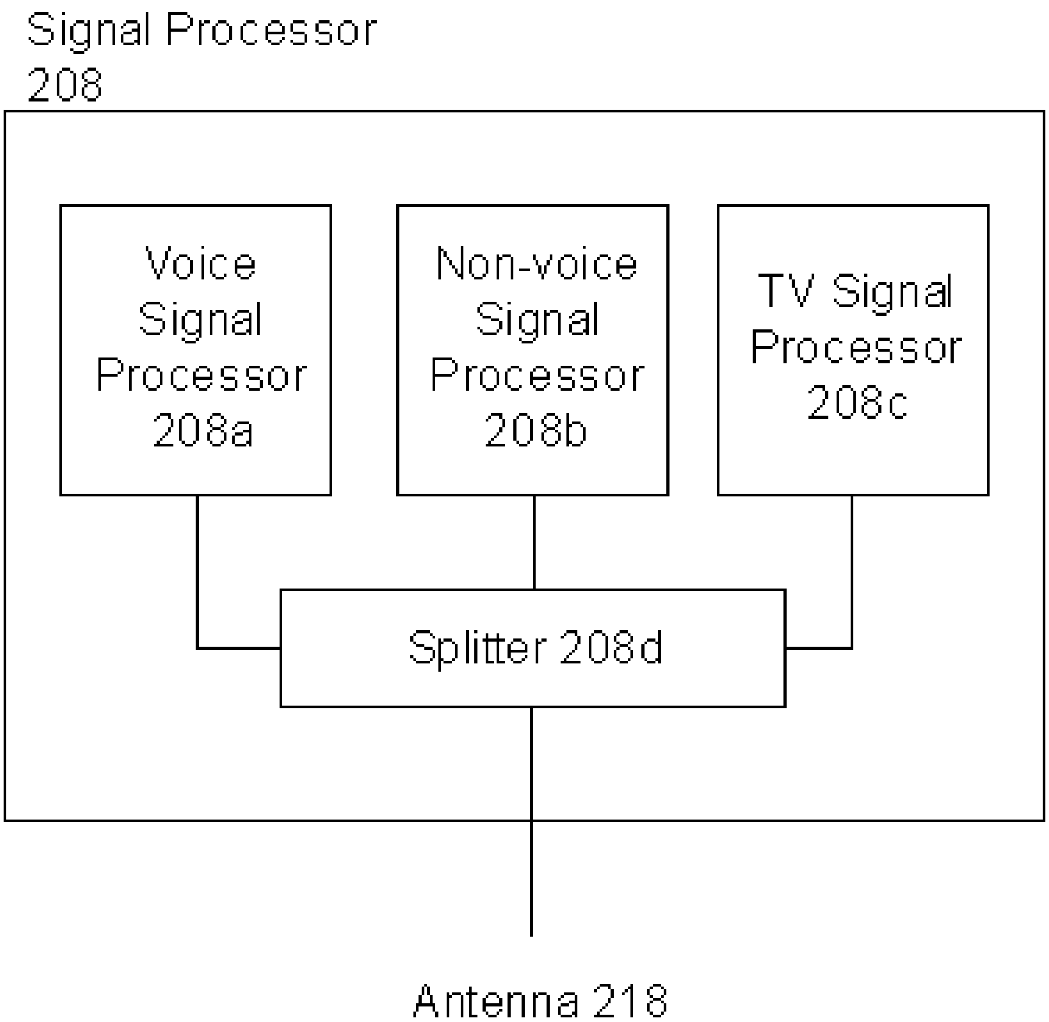
FIG. 93 is a block diagram illustrating an exemplary embodiment of the present invention.

FIG. 93 illustrates the basic structure of Signal Processor 208 (FIG. 1). Signal processor 208 is primarily composed of Voice Signal Processor 208*a*, Non-Voice Signal Processor 208*b*, TV Signal Processor 208*c*, and Splitter 208*d*. Splitter 208*d* distributes a plurality of wireless signals received from Antenna 218 (FIG. 1) to Voice Signal Processor 208*a*, Non-Voice Signal Processor 208*b*, and TV Signal Processor 208*c*. Voice Signal Processor 208*a* processes the voice signal received via Antenna 218 and decodes such signal so as to output the voice signal from Speaker 216 (FIG. 1). Non-Voice Signal Processor 208*b* processes various kinds of non-voice signals, such as, but not limiting to, channel controlling signals, GPS signals, and internet signals, so as to format and decode the received signals to be readable by CPU 211 (FIG. 1). Packet signals, i.e., a series of signals composed of packets, are also processed by Non-Voice Signal Processor 208*b*. Packet signals representing voice signals are also processed by Non-Voice Signal Processor 208*b*. TV Signal Processor 208*c* processes the plurality of wireless signals received in the manners described in FIGS. 88, 89, 91, and 92 in order for the channel data included therein to be decoded and thereby be output from LCD 201 (FIG. 1) and Speaker 216 (FIG. 1).

Figure 94:
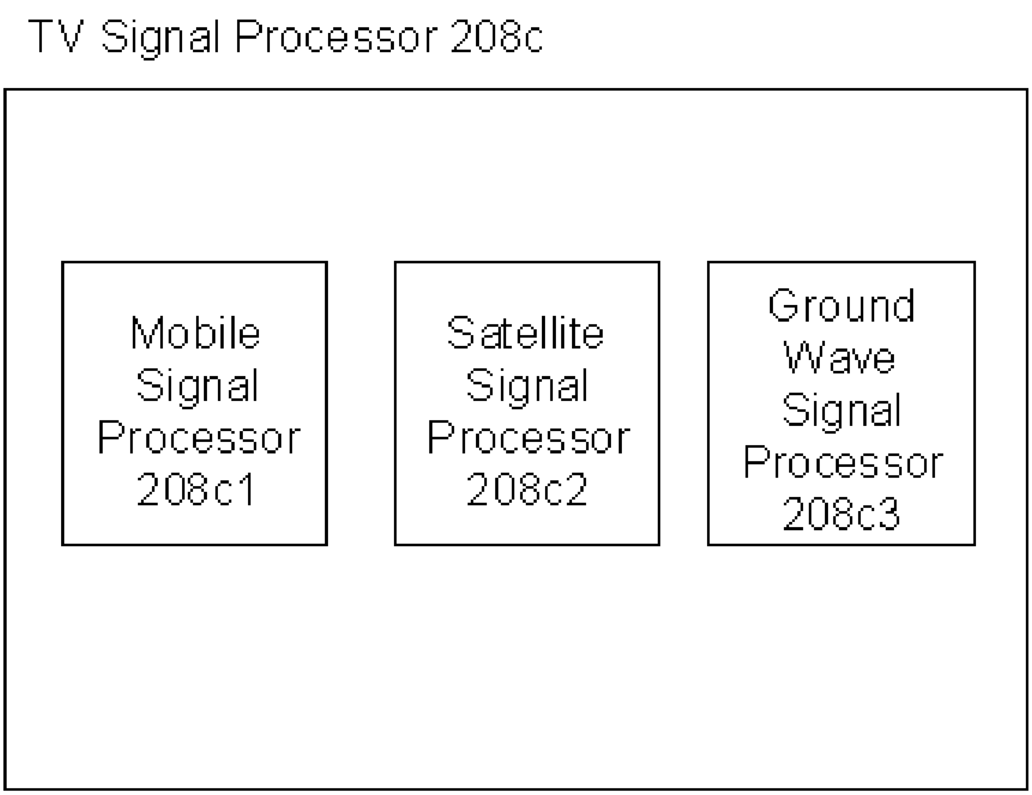
FIG. 94 is a block diagram illustrating an exemplary embodiment of the present invention.

FIG. 94 illustrates the basic structure of TV Signal Processor 208*c* described in FIG. 93. TV Signal Processor 208*c* is primarily composed of Mobile Signal Processor 208*c*1, Satellite Signal Processor 208*c*2, and Ground Wave Signal Processor 208*c*3. Mobile Signal Processor 208*c*1 processes a plurality of mobile signals received in the manners described in FIGS. 88 and 89 in order for the channel data included therein to be decoded and thereby be output from LCD 201 (FIG. 1) and Speaker 216 (FIG. 1). Satellite Signal Processor 208*c*2 processes a plurality of Satellite Signal SS received in the manner described in FIG. 91 in order for the channel data included therein to be decoded and thereby be output from LCD 201 (FIG. 1) and Speaker 216 (FIG. 1). Ground Wave Signal Processor 208*c*3 processes a plurality of Ground Wave Signal GWS received in the manner described in FIG. 92 in order for the channel data included therein to be decoded and thereby be output from LCD 201 (FIG. 1) and Speaker 216 (FIG. 1).

As another embodiment of the present invention, Voice Signal Processor 208*a* (FIG. 98), Non-Voice Signal Processor 208*b* (FIG. 98), and TV Signal Processor 208*c* (FIG. 98) may be integrated and merged into one circuit and eliminate Splitter 208*d* in order to highly integrate Signal Processor 208 (FIG. 1).

Figure 95A:
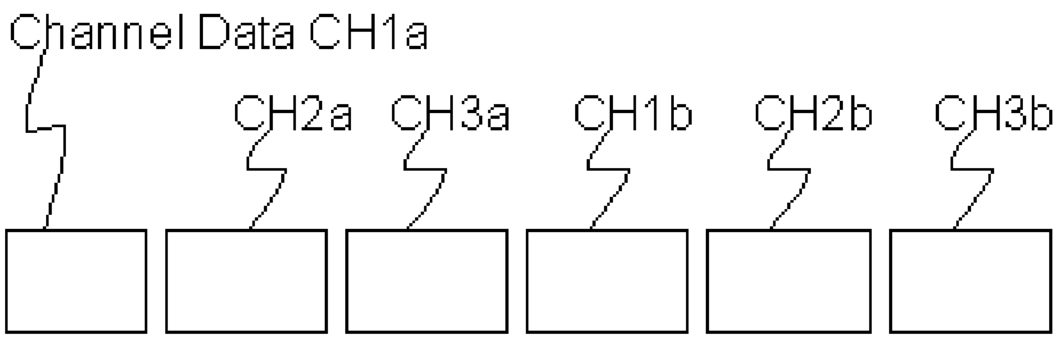
FIG. 95*a* is a simplified illustration of data utilized in the present invention.
Figure 95B:
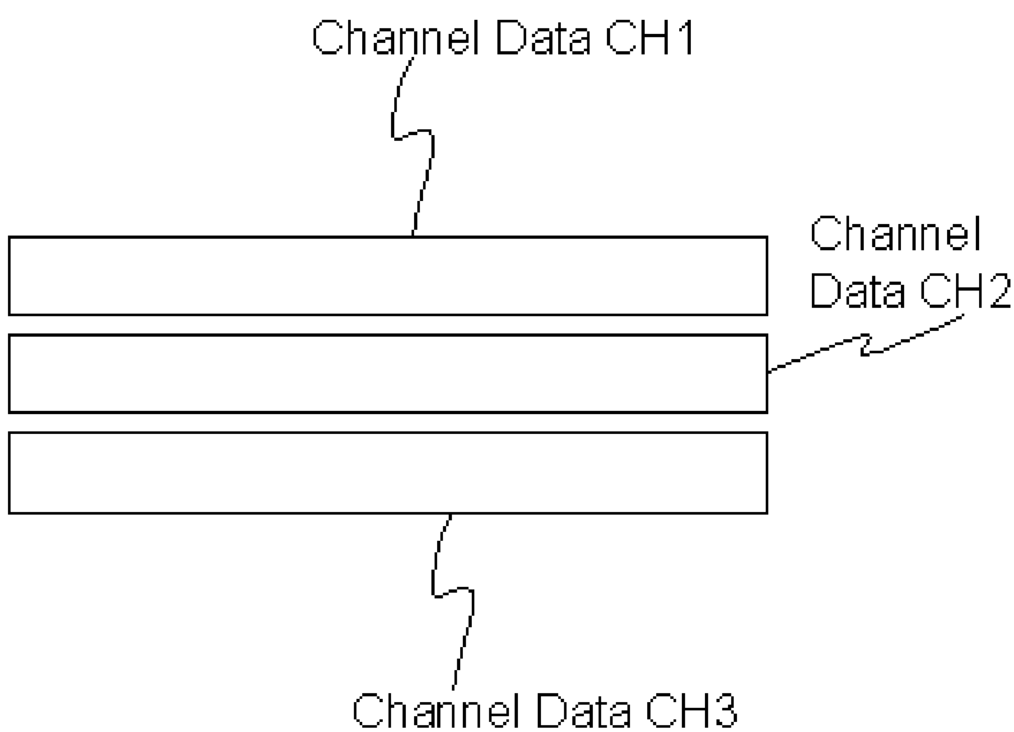
FIG. 95*b* is a simplified illustration of data utilized in the present invention.

FIGS. 95*a* and 95*b* illustrate the format of the plurality of channel data transferred described in FIGS. 88, 89, 91, and 92. As described in FIG. 95*a*, a plurality of channel data can be distributed in a TDMA format. In the example shown in FIG. 95*a*, Channel Data CH1 is divided into CH1*a* and CH1*b*, Channel Data CH2 is divided into CH2*a* and CH2*b*, and Channel Data CH3 is divided into CH3*a* and CH3*b*, and transferred in the order shown in FIG. 95*a*. Instead of 'chopping' each channel data as described in FIG. 95*a*, Channel Data CH1, CH2, and CH3 can be transferred in different frequencies (FDMA format) or scramble all of them and transfer within a certain width of frequency (CDMA or W-CDMA).

Figure 96:
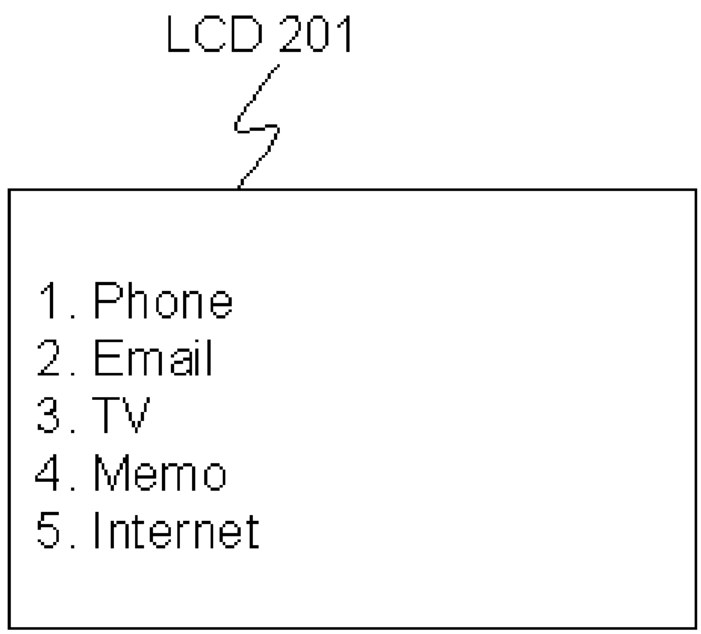
Figure 97:
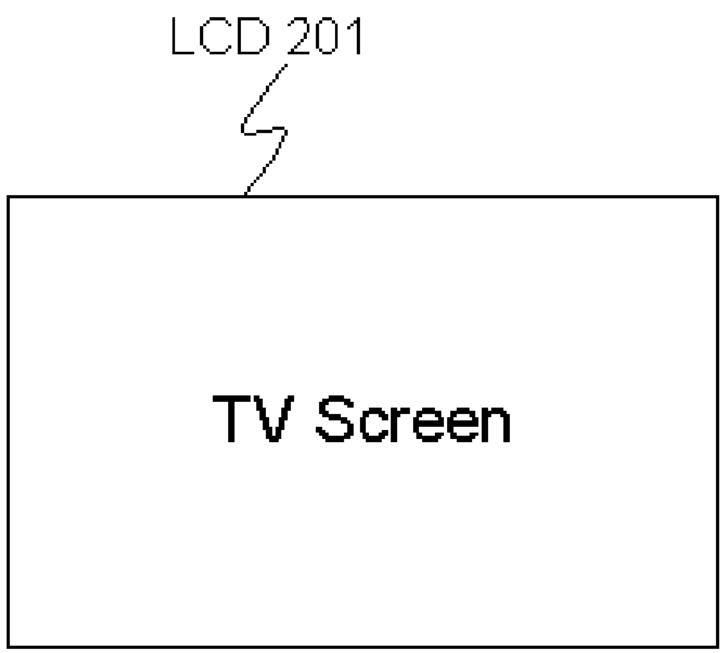

FIG. 96 illustrates the menu displayed on LCD 201 (FIG. 1). In the example described in FIG. 96, the user of Communication Device 200 has an option to select one of the functions installed in Communication Device 200. Namely, the user can, by manipulation of Input Device 210 or by the voice recognition system, utilize Communication Device 200 as a cellular phone by selecting '1. Phone', as an email editor and send and/or receive emails by selecting '2. Email', as a TV monitoring device by selecting '3. TV', as a word processor by selecting '4. Memo', and as an Internet accessing device by selecting '5. Internet'. As illustrated in FIG. 97, a TV screen is displayed on LCD 201 by selecting '3. TV'.

Figure 98:
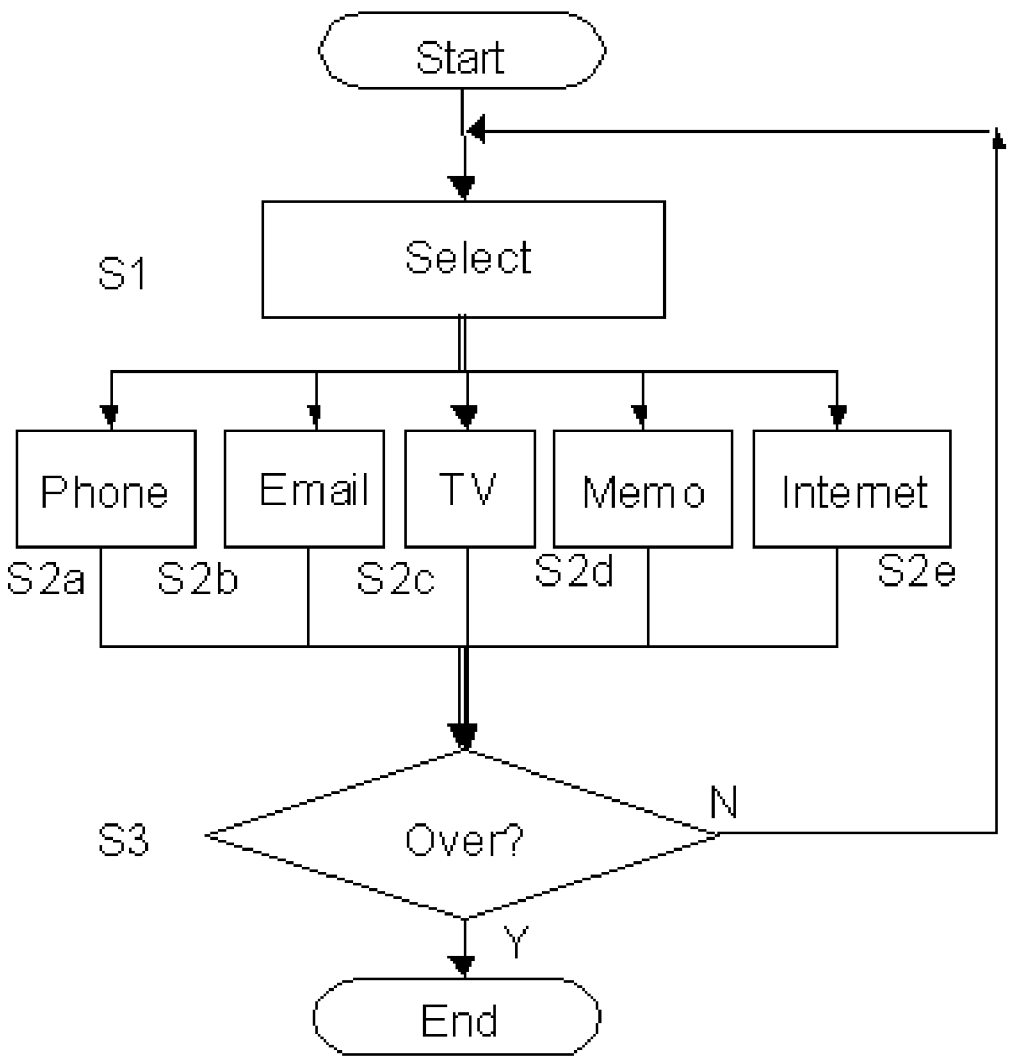

FIG. 98 illustrates the software program which administers the overall function explained in FIG. 96. From the kind of the input signal input from Input Device 210 or by the voice recognition system, the related function assigned to such input signal is activated by CPU 211 (FIG. 1) (S1). For example, a phone function is activated when input signal '1' is input from Input Device 210 (S2*a*), an email function is activated when input signal '2' is input from Input Device 210 (S2*b*), a TV monitoring function is activated when input signal '3' is input from Input Device 210 (S2*c*), a word processing function is activated when input signal '4' is input from Input Device 210 (S2*d*), and an internet function is activated when input signal '5' is input from Input Device 210 (S2*e*). Another function can be selected from the menu described in FIG. 96 via Input Device 210 or by the voice recognition system after selecting one function, and enables to activate one function while the other function is still running (S3). For example, the user can utilize the phone function while watching TV, or access the Internet while utilizing the phone function.

Figure 99:
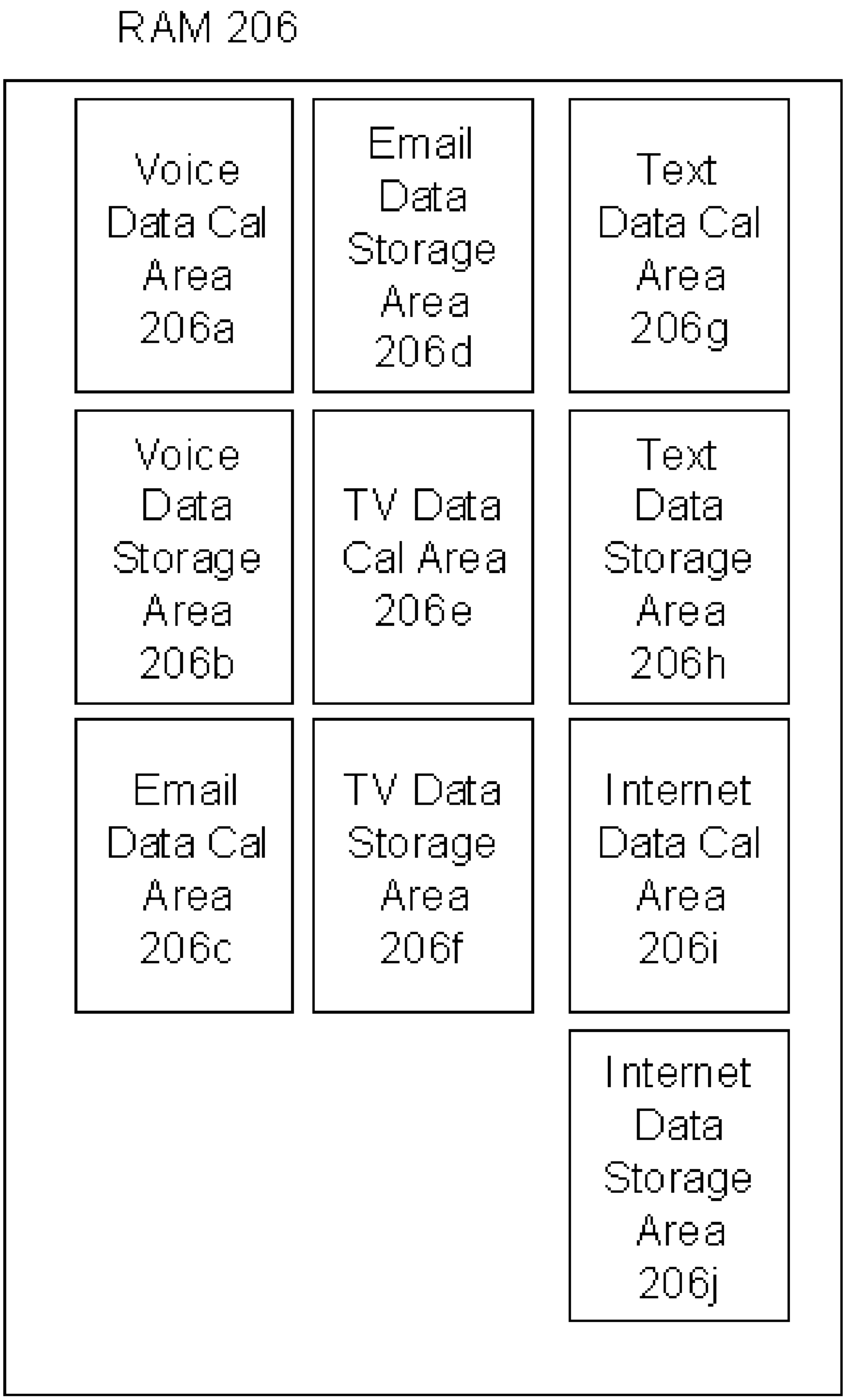

FIG. 99 illustrates the information stored in RAM 206 (FIG. 1) in order to implement the foregoing functions. Voice Data Calculating Area 206*a*208*c*3 stores a software program to implement the phone function as described in S2*a* of FIG. 98, and Voice Data Storage Area 206*b* stores the voice data received from or sending via Voice Signal Processor 208*a* (FIG. 93). Email Data Calculating Area 206*c* stores a software program to implement the email function as described in S2*b* in FIG. 98, and Email Data Storage Area 206*d* stores the email data received from or sending via Non-Voice Signal Processor 208*b* (FIG. 93). TV Data Calculating Area 206*e* stores a software program to implement the cellular TV function as described in S2*c* of FIG. 98, and TV Data Storage Area 206*f* stores the channel data received from TV Signal Processor 208*c*. Text Data Calculating Area 206*g* stores a software program to implement the word processing function as described in S2*d* of FIG. 98, and Text Data Storage Area 206*h* stores a series of text data which are input and/or edited by utilizing Input Device 210 or via voice recognition system. Internet Data Calculating Area 206*i* stores a software program to implement the Internet function as described in S2*e* of FIG. 98, and Internet Data Storage Area 206*j* stores a series of internet data, such as, but not limited to, HTML data, XML data, image data, audio/visual data, and other various types of data received from Non-Voice Signal Processor 208*b*. Some types of voice data, such as the voice data in a form of packet received from or sending via Non-Voice Signal Processor 208*b* may be stored in Voice Data Storage Area 206*b*.

Figure 100:
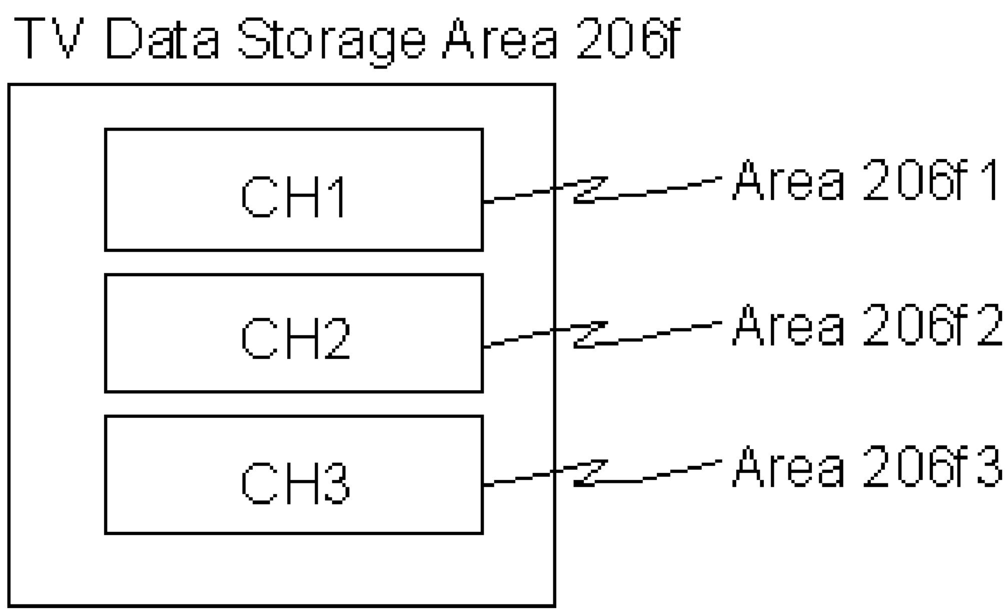

FIG. 100 illustrates the information stored in TV Data Storage Area 206*f* described in FIG. 99. In the example shown in FIG. 100, three types of channel data are stored in TV Data Storage Area 206*f*. Namely, channel data regarding Channel 1 is stored in Area 206*f*1, channel data regarding Channel 2 is stored in Area 206*f*2, and channel data regarding Channel 3 is stored in Area 206*f*3. Here, each channel data is primarily composed of a series of motion picture data and a series of subtitle data which are designed to be displayed on LCD 201 (FIG. 1) and a series of audio data which are designed to be output from Speaker 216 (FIG. 1).

Figure 101:
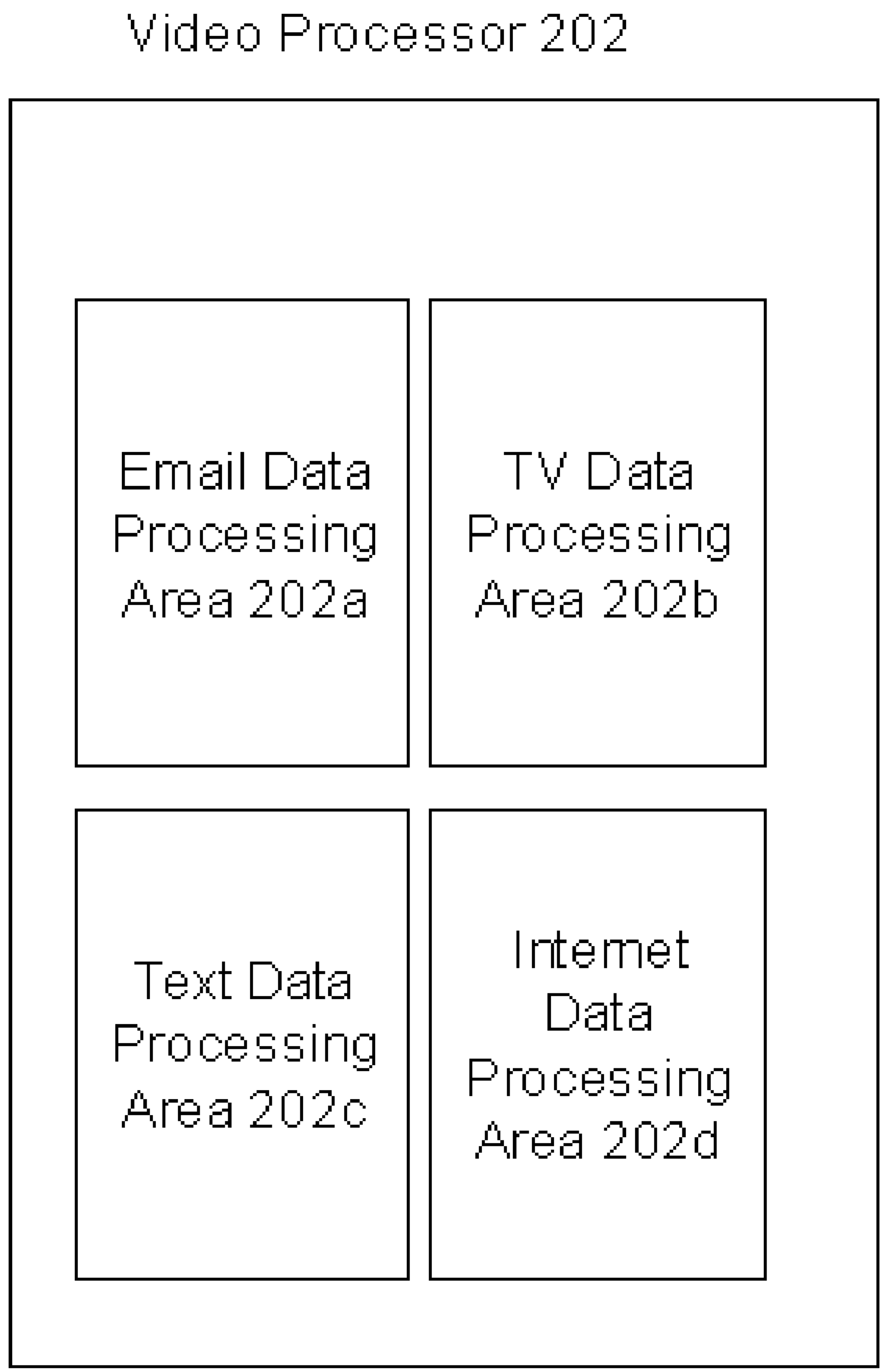

FIG. 101 illustrates the structure of Video Processor 202 described in FIG. 1. Email Data Processing Area 202*a* processes the email data stored in Email Data Storage Area 206*d* (FIG. 99) to be displayed on LCD 201 (FIG. 1). TV Data Processing Area 202*b* processes the channel data stored in TV Data Storage Area 206*f* (FIG. 99) to be displayed on LCD 201 (FIG. 1). Text Data Processing Area 202*c* processes the text data stored in Text Data Storage Area 206*h* (FIG. 99) to be displayed on LCD 201 (FIG. 1). Internet Data Processing Area 202*d* processes the internet data stored in Internet Data Storage Area 206*j* (FIG. 99) to be displayed on LCD 201 (FIG. 1). As another embodiment of the present invention, Email Data Processing Area 202*a*, TV Data Processing Area 202*b*, Text Data Processing Area 202*c*, and Internet Data Processing Area 202*d* may be merged into one circuit and delegate its function to CPU 211 (FIG. 1) in order to highly integrate Video Processor 202.

<<Cellular TV—Incoming Message Notice Displaying Function>>

Figure 102:
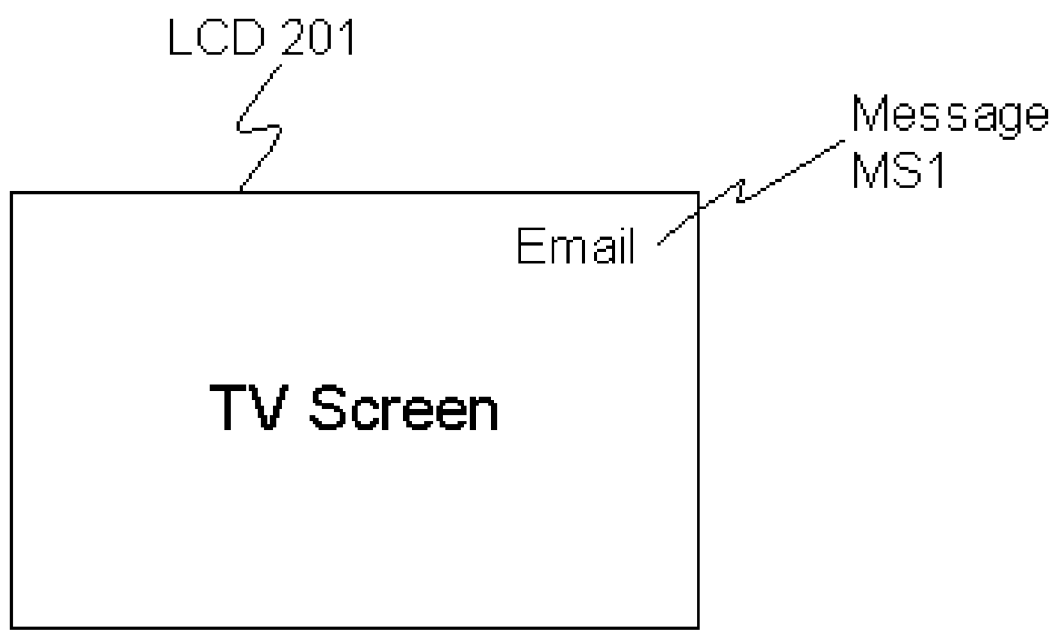
Figure 103:
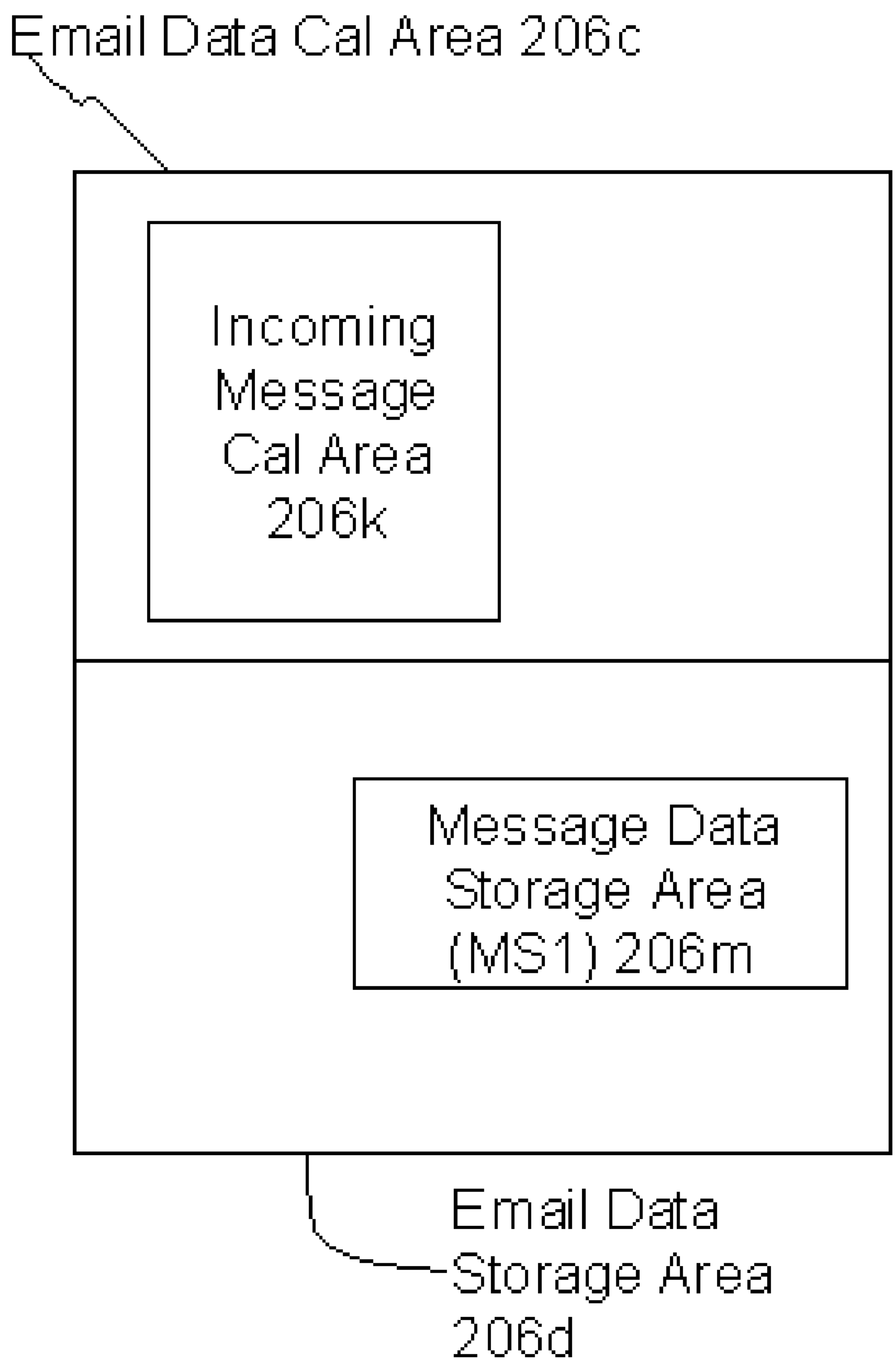
Figure 104:
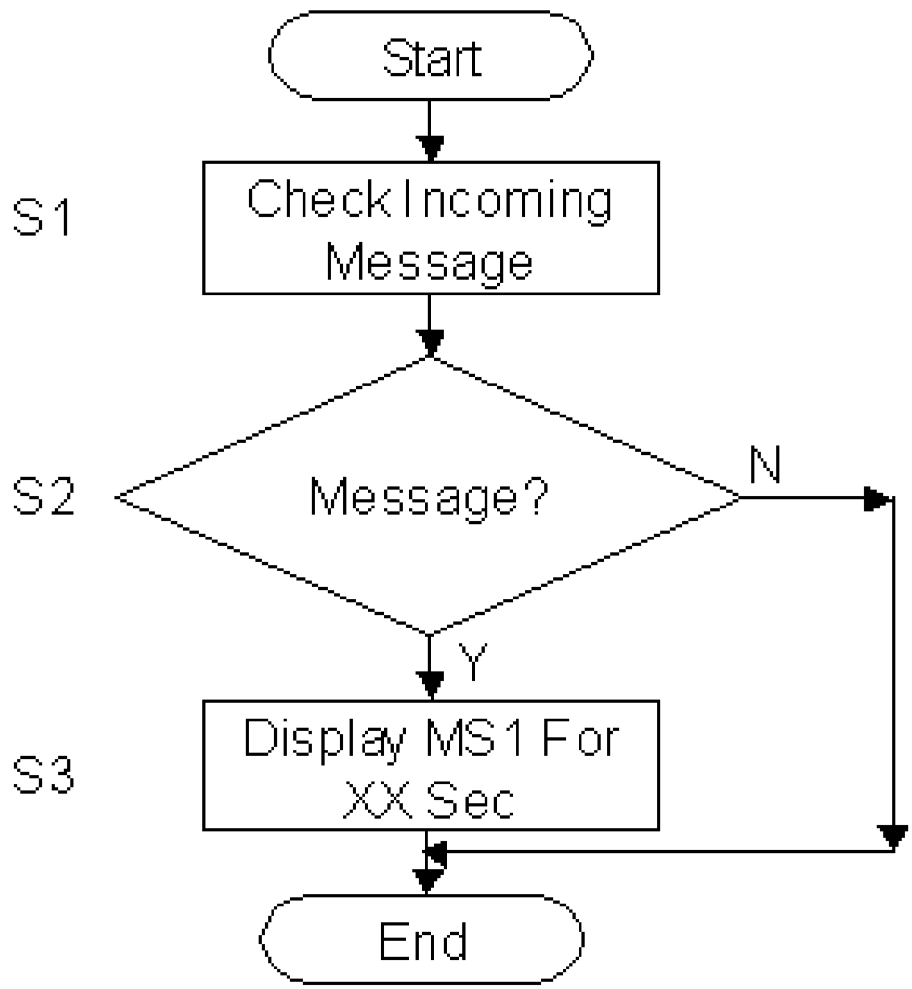

FIGS. 102 through 104 illustrate the function of displaying a notice of incoming message.

As described in FIG. 102, Message MS1 is shown at the upper right corner of LCD 201 (FIG. 1) indicating that a new email has arrived while TV monitoring function is implemented.

FIG. 103 illustrates the data stored in Email Data Calculating Area 206*c* (FIG. 99) and Email Data Storage Area 206*d* (FIG. 99) in order to implement the incoming message function. Email Data Calculating Area 206*c* includes Incoming Message Calculating Area 206*k* which stores a software program program described in FIG. 104 hereinafter, and Email Data Storage Area 206*d* includes Message Data Storage Area (MS1) 206*m* which stores the text data of MS1 (in the present example, the text data 'Email' as shown in FIG. 102).

FIG. 104 illustrates the software program stored in Incoming Message Calculating Area 206*k* (FIG. 103). First of all, CPU 211 (FIG. 1) checks whether a new incoming message has arrived by scanning Email Data Storage Area 206*d* (FIG. 103) (S1). If a new message has arrived (S2), CPU 211 retrieves the text data (MS1) from Message Data Storage Area (MS1) 206*m* and displays on LCD 201 (FIG. 1) as described in FIG. 102 for a specified period of time (S3). The software program is executed periodically with a fixed interval.

<<Cellular TV—Video Recording Function>>

FIGS. 105 through 108 illustrate the function of video recording the TV programs, i.e., a series of channel data, of Communication Device 200 (FIG. 1).

Figure 105:
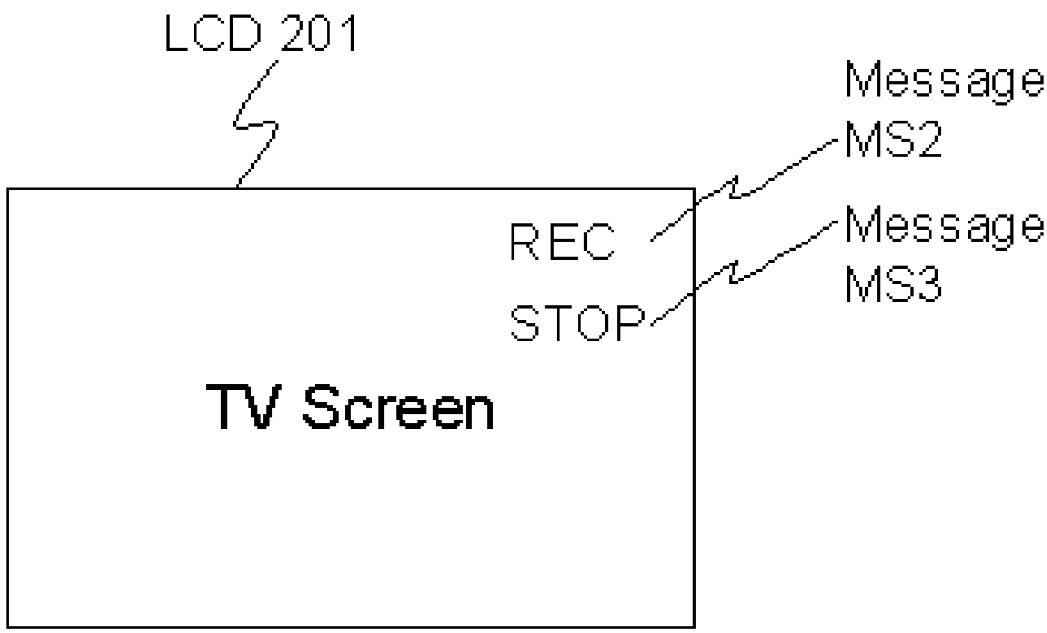

As described in FIG. 105, Message MS2 is shown on LCD 201 (FIG. 1) when the video recording function is implemented, and Message MS3 is shown when the implementation of the video recording function has been terminated.

Figure 106:
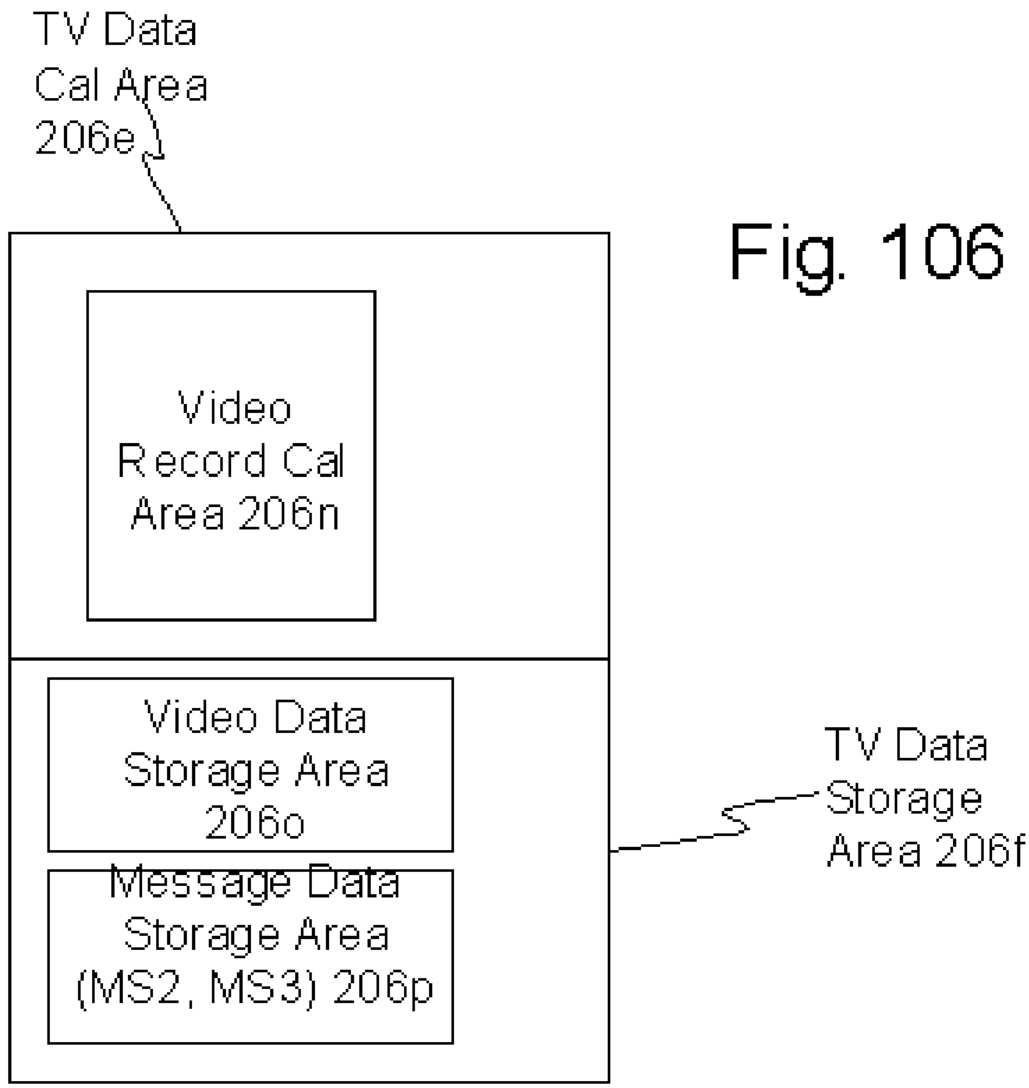

FIG. 106 illustrates the information stored in TV Data Calculating Area 206*e* (FIG. 99) and TV Data Storage Area 206*f* (FIG. 99) in order to implement the video recording function. TV Data Calculating Area 206*e* includes Video Record Calculating Area 206*n* which stores a software program to implement the present function which is further explained in details in FIGS. 107 and 108. TV Data Storage Area 206*f* includes Video Data Storage Area 206*o* and Message Data Storage Area (MS2, MS3) 206*p*. Video Data Storage Area 206*o* stores the recorded channel data retrieved from TV Data Storage Area 206*f*, more specifically from either Area 206*f*1, Area 206*f*2, or Area 206*f*3 described in FIG. 100. Video Storage Area 206*o* is divided into several sectors (not shown), therefore a plurality of channel data can be recorded and stored simultaneously.

Figure 107:
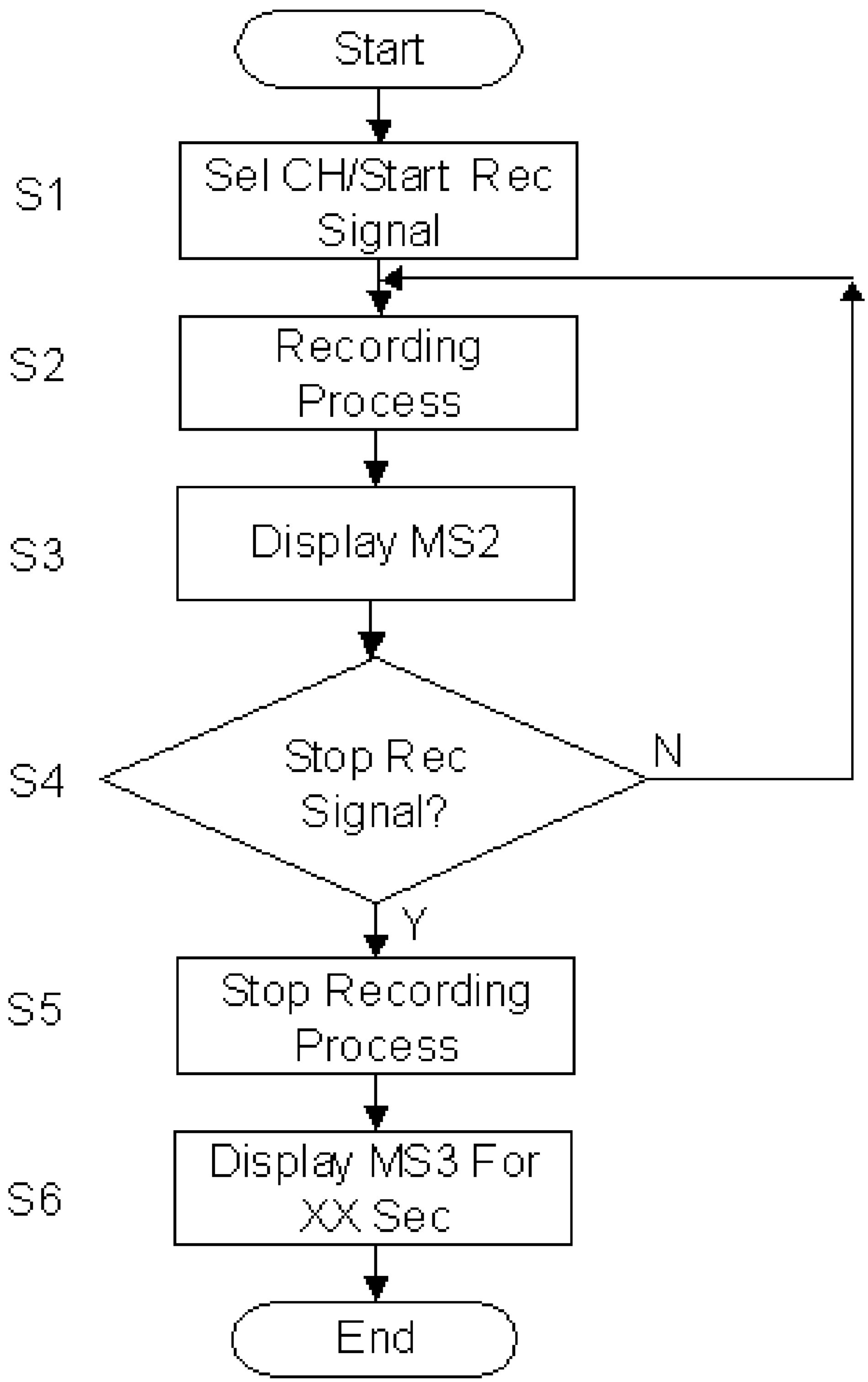

FIG. 107 illustrates the software program stored in Video Record Calculating Area 206*n*. When a certain channel data (i.e., TV program) has been selected and start recording signal has been input by utilizing Input Device 210 (FIG. 1) or via voice recognition system (S1), CPU 211 (FIG. 1) initiates the recording process, i.e., retrieves the relevant channel data from either Area 206*f*1, Area 206*f*2, or Area 206*f*3 described in FIG. 100 and stores in one sector (not shown) in Video Data Storage Area 206*o* (FIG. 106) (S2). During the recording process, the text data of Message MS2 is retrieved from Message Data Storage Area (MS2, MS3) 206*p* (FIG. 106) and displayed at the upper right corner of LCD 201 (FIG. 1) as described in FIG. 105 indicating that the video recording function is in process (S3). If the stop recording signal is input by utilizing Input Device 210 (FIG. 1) or via voice recognition system indicating to stop the video recording process (S4), CPU 211 stops the video recording process (S5), and retrieves the text data of Message MS3 from Message Data Storage Area (MS2, MS3) 206*p* and displays at the upper right corner of LCD 201 as shown in FIG. 105 for a specified period of time (S6). Since Video Storage Area 206*o* is divided into several sectors as stated above, S1 from S6 can be repeated to record and store a plurality of channel data simultaneously.

FIG. 108 illustrates the software program stored in Video Record Calculating Area 206*n* to playback the recorded channel data. First, a channel data is selected and playback signal is input by utilizing Input Device 210 (FIG. 1) or via voice recognition system (S1). Once these signals are received, CPU 211 (FIG. 1) initiates the playback process of the recorded channel data, i.e., CPU 211 retrieves the selected channel data from Video Data Storage Area 206*o* (FIG. 106), and TV data processing Area 202*b* (FIG. 101) of Video Processor 202 (FIG. 1) processes the channel data to be displayed on LCD 201 (FIG. 1) (S2). This playback process continues until a stop playback signal is input by utilizing Input Device 210 or via voice recognition system (S3). When a stop playback signal is input by utilizing Input Device 210 or via voice recognition system, CPU 211 stops the foregoing processes, and retrieves the text data of Message MS3 from Message Data Storage Area (MS2, MS3) 206*p* and displays at the upper right corner of LCD 201 as shown in FIG. 105 for a specified period of time (S4).

<<Cellular TV—Screen Shot Function>>

FIGS. 109 through 112 illustrate the function of screen shot of Communication Device 200 (FIG. 1), i.e., a function to capture the screen displayed on LCD 201 (FIG. 1) and store it as a single image.

As described in FIG. 109, Message MS4 is shown on LCD 201 (FIG. 1) when the screen shot function is implemented.

FIG. 110 illustrates the information stored in TV Data Calculating Area 206*e* (FIG. 99) and TV Data Storage Area 206*f* (FIG. 99) in order to implement the screen shot function. TV Data Calculating Area 206*e* includes Screen Shot Calculating Area 206*q* which stores a software program to implement the present function which is further explained in details in FIGS. 111 and 112. TV Data Storage Area 206*f* includes Screen Shot Data Storage Area 206*r* and Message Data Storage Area (MS4) 206*s*. Screen Shot Data Storage Area 206*r* stores the recorded image data retrieved from TV Data Storage Area 206*f*, more specifically from either Area 206*f*1, Area 206*f*2, or Area 206*f*3 described in FIG. 100. Screen Shot Storage Area 206*r* is divided into several sectors (not shown), therefore a plurality of image data can be recorded and stored simultaneously.

FIG. 111 illustrates the software program stored in Screen Shot Calculating Area 206*q*. When a start recording signal has been input by utilizing Input Device 210 (FIG. 1) or via voice recognition system (S1), CPU 211 (FIG. 1) initiates the recording process, i.e., retrieves an image data, which is currently displayed on LCD 201 (FIG. 1), from the relevant area of TV Data Storage Area 206*f*, i.e., from either Area 206*f*1, Area 206*f*2, or Area 206*f*3 described in FIG. 100, and stores in one of the sectors (not shown) in Screen Shot Data Storage Area 206*r* (FIG. 110) (S2). CPU 211 retrieves the text data of Message MS4 from Message Data Storage Area (MS4) 206*s* (FIG. 110) and displays at the upper right corner of LCD 201 (FIG. 1) as described in FIG. 109 for a specific period of time indicating that the screen shot function is implemented (S3). Then CPU 211 retrieves the image data which is just stored in Screen Shot Data Storage Area 206*r* (FIG. 110), and TV Data Processing Area 202*b* (FIG. 101) of Video Processor 202

(FIG. 1) processes the image data to be displayed on LCD 201 (FIG. 1) for a specific period of time (S4). Since screen shot storage Area 206*r* is divided into several sectors as stated above, S1 from S4 can be repeated to record and store a plurality of image data.

FIG. 112 illustrates the software program stored in Screen Shot Calculating Area 206*q* (FIG. 110) to display the recorded image data. First, an image data is selected by utilizing Input Device 210 (FIG. 1) or via voice recognition system (S1). When this signal is received, CPU 211 (FIG. 1) initiates the display process of the recorded image data, i.e., CPU 211 retrieves the selected image data from Screen Shot Data Storage Area 206*r*, and TV Data Processing Area 202*b* (FIG. 101) of Video Processor 202 (FIG. 1) processes the image data to be displayed on LCD 201 (FIG. 1) (S2). The image data is displayed until a close signal is input by utilizing Input Device 210 or via voice recognition system (S3). When a close signal is input by utilizing Input Device 210 or via voice recognition system, CPU 211 terminates to display the image data (S4).

<<Cellular TV—Timer Video Recording Function(1)>>

FIGS. 113 through 118 illustrate the timer video recording function of Communication Device 200 (FIG. 1), i.e., a function to video record the TV programs (a series of channel data) at specified times.

FIG. 113 illustrates the items which are input by utilizing Input Device 210 (FIG. 1) or via voice recognition system. As described in FIG. 113, the items which are input by utilizing Input Device 210 or via voice recognition system are displayed on LCD 201. Here, the items are the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode'. The high quality mode records the selected TV program (i.e., channel data) with the best quality, however, the available length of time to record is limited. The standard mode records the selected TV program with the standard quality, and the available length of time to record is fairly long. The 'x3 mode' records the selected TV program with lesser quality compared to the standard mode, however, the available length of time to record is fairly long compared to the standard mode. The 'x6 mode' records the selected TV program with lesser quality compared to the 'x3 mode', however, the available length of time to record is fairly long compared to the 'x3 mode'.

FIG. 114 illustrates the software program stored in Video Record Calculating Area 206*n* (FIG. 106) to specify the items described in FIG. 113. First of all, the channel number is selected by utilizing Input Device 210 (FIG. 1) or via voice recognition system (S1). Next, the start time (S2), the stop time (S3), and the mode (S4) are input and/or selected in the same manner. Once the foregoing steps are completed, more series of S1 through S4 can be repeated as many as the user of Communication Device 200 desires (S5). Namely, the function of timer video recording enables to timer record more than one TV programs (i.e., a plurality of channel data).

FIG. 115 illustrates the software program stored in Video Record Calculating Area 206*n* (FIG. 106) to implement the timer video recording function. Once the function of timer video recording is initiated by utilizing Input Device 210 (FIG. 1) or via voice recognition system (S1), CPU 211 (FIG. 1) checks the current time (S2). If the current time matches the start time specified by the process described in S2 of FIG. 114 (S3), then CPU 211 identifies the channel number to be recorded and the mode selected of which the details are explained in S4 of FIG. 113 (S4), and initiates the recording process of the TV program (i.e., channel data) (S5). CPU 211 continues the recording process until the current time matches the stop time specified by the process described in S3 of FIG. 114 (S6). The recording process is terminated when the current time matches the stop time (S7).

FIG. 116 illustrates the data stored in video data storage Area 206*o* (FIG. 106). As described in FIG. 116, Video Data Storage Area 206*o* is divided into certain areas in order to store a plurality of channel data. In the example presented in FIG. 116, the TV programs (a plurality of channel data) of channel numbers 1, 2, and 3 are stored in Areas 206*o*1, 206*o*2, and 206*o*3, respectively. Since Video Data Storage Area 206*o* is divided into certain areas and thereby enables to store a plurality of channel data (here, the channel data of Channel 1, 2, and 3), a plurality of channel data (more than one TV programs) can be recorded simultaneously.

FIG. 117 illustrates the area in which the items described in FIG. 113 are stored. As described in FIG. 117, the data regarding the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode' are stored in Timer Data Storage Area 206*t* of RAM 206 (FIG. 1).

FIG. 118 illustrates the details of Timer Data Storage Area 206*t* (FIG. 117). Timer Data Storage Area 206*t* is composed of two types of areas. The first area administers the current time, and the second area stores the items explained in FIG. 113. Here, the first area is Timer 206*t*4 and provides the current time to CPU 211 (FIG. 1), which is utilized in S3 (initiation of the video recording) and S6 (termination of the video recording) of the flowchart described in FIG. 115. The second area is described as Areas 206*t*1, 206*t*2, and 206*t*3. The number of the second area corresponds with the number of the areas allocated in Video Data Storage Area 206*o* explained in FIG. 116. Each of Areas 206*t*1, 206*t*2, and 206*t*3 stores the data regarding the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode'. In sum, Area 206*t*1 stores the start time, the stop time, and the mode for Channel 1, Area 206*t*2 stores the start time, the stop time, and the mode for Channel 2, and Area 206*t*3 stores the start time, the stop time, and the mode for Channel 3.

<<Cellular TV—PC Download Function>>

FIGS. 119 and 120 illustrate the function to download various types of data stored in Communication Device 200 to a personal computer.

FIG. 119 illustrates the basic components to implement the present function. As described in FIG. 119, Communication Device 200 transmits a series of PC Download Signal PDS to Personal Computer PC. Such sequence is performed under the control of CPU 211 (FIG. 1). PC Download Signal PDS carries a plurality of data stored in Communication Device 200, more specifically in RAM 206 (FIG. 1). Logically any types of data can be transmitted from Communication Device 200 to Personal Computer PC. For example, data, software program, and other various types of information stored in Voice Data Calculating Area 206*a*208*c*3, Voice Data Storage Area 206*b*, Email Data Calculating Area 206*c*, Email Data Storage Area 206*d*, TV Data Calculating Area 206*e*, TV Data Storage Area 206*f*, Text Data Calculating Area 206*g*, Text Data Storage Area 206*h*, Internet Data Calculating Area 206*l*, Internet Data Storage Area 206*j*, all of which are stored in RAM 206 as explained in FIG. 99, can be transmitted from Communication Device 200 to Personal Computer PC.

The method of transmitting a series of PC Download Signal PDS can be arranged in several ways. The first method is to transmit a series of PC Download Signal PDS directly from Communication Device 200 to Personal Computer PC as described in FIG. 119. In this method, CPU 211 (FIG. 1) first of all scans the target (i.e., data, software program, or other types of information to be transmitted) and PC Download Signal PDS, which carries such target, is directly transmitted to Personal Computer PC via Antenna 218 (FIG. 1) in a wireless fashion. In order to implement the first method, Personal Computer PC must have the capability to send and receive data in a wireless fashion. The second method is to transmit a series of PC Download Signal PDS indirectly from Communication Device 200 to Personal Computer PC utilizing network, such as the Internet. In this method, CPU 211 (FIG. 1) first of all scans the target (i.e., data, software program, or other types of information to be transmitted) and PC Download Signal PDS, which carries such target, is transmitted to a computer (e.g., the Internet server, however, not shown) or a computer connected thereto (not shown) in a wireless fashion. Here, the computer (e.g., the Internet server) or the computer connected thereto has the capability to send and receive data in a wireless fashion. The computer (e.g., the Internet server) or the computer connected thereto is connected to the network (e.g., the Internet). Then the computer (e.g., the Internet server) or the computer connected thereto transmits the target to Personal Computer PC via network by an ordinary method commonly utilized to transfer data via network. No capability for Personal Computer PC to send and receive data in a wireless fashion is required in this method. The third method is to transmit a series of PC Download Signal PDS indirectly from Communication Device 200 to personal computer utilizing artificial satellite (not shown). In this method, CPU 211 (FIG. 1) first of all scans the target (i.e., data, software program, or other types of information to be transmitted) and PC Download Signal PDS, which carries such target, is transmitted to an artificial satellite in a wireless fashion. The satellite is connected to a network (e.g., the Internet, however, not shown). Then the satellite transmits the target to Personal Computer PC via network by an ordinary method commonly utilized to transfer data from a satellite via network to a computer connected thereto. No capability for Personal Computer PC to send and receive data in a wireless fashion is required in this method.

FIG. 120 illustrates the software program stored in a specific area of RAM 206 (FIG. 1) to implement the present function. As described in FIG. 120, a list of data, software program, and other various types of information stored in RAM 206 is displayed on LCD 201 (FIG. 1) under the control of CPU 211 (FIG. 1) (S1). In the next step, one or more of data, software program, and other various types of information, which are to be the components of the target, are selected by utilizing Input Device 210 (FIG. 1) or via voice recognition system (S2). The method of transmitting the target is selected in the same manner (S3). Once a start signal indicating to initiate the downloading process is input by utilizing Input Device 210 or via voice recognition system (S4), the downloading process is initiated by the method selected in S3 (S5) until the target is completely downloaded to Personal Computer PC (S6). Once CPU 211 (FIG. 1) detects that the target has been completely downloaded to Personal Computer PC to the last bit, the downloading process is terminated (S7).

<<Cellular TV—Sending By Email Function>>

FIGS. 121 through 123 illustrate the method to send the recorded TV program (i.e., channel data) and screen shot data via emails.

FIG. 121 illustrates the items displayed on LCD 201 (FIG. 1). By way of utilizing Input Device 210 (FIG. 1) or the voice recognition system, the receiver's address is typed in 'Email Address' column, another email address is typed in 'CC' column, the title or the subject of the email is typed in 'Subject' column, the locations of recorded TV program (i.e., channel data) and/or screen shot data in RAM 206 (FIG. 1) are typed in 'Attachment', and a series of text data, i.e., a message to the receiver of the email is typed in 'Text' column.

FIG. 122 illustrates the data stored in RAM 206 (FIG. 1) for purposes of sending the recorded TV program (i.e., channel data) and screen shot data via emails. As described in FIG. 122, RAM 206 (FIG. 1) includes four areas to implement the present function, i.e., Email Information Storage Area 206*u*, Email Information Calculating Area 206*v*, Video Data Storage Area 206*w*, and Screen Shot Data Storage Area 206*x*. Email Information Storage Area 206*u* stores the information regarding the items explained in FIG. 121, namely the receiver's address typed in 'Email Address' column, another email address typed in 'CC' column, the title or the subject of the email typed in 'Subject' column, the locations of recorded TV program (i.e., channel data) and/or screen shot data in RAM 206 (FIG. 1) typed in 'Attachment', and a series of text data, i.e., a message to the receiver of the email typed in 'Text' column. Email Information Calculating Area 206*v* stores the software program explained in FIG. 123 hereinafter. Video Data Storage Area 206*w* stores the recorded TV program (i.e., channel data) which is to be attached to and sent by the email. Screen Shot Data Storage Area 206*x* stores the screen shot data which is to be attached to and sent by the email.

FIG. 123 illustrates the software program stored in Email Information Calculating Area 206*v*. First, all the items described in FIG. 121 are input by utilizing Input Device 210 (FIG. 1) or the voice recognition system (S1). Once a send signal is input by utilizing Input Device 210 or via voice recognition system indicating to send the email (S2), CPU 211 (FIG. 1) attaches the recorded TV program (i.e., channel data) and/or the screen shot data stored in Video Data Storage Area 206*w* and/or Screen Shot Data Storage Area 206*x*(S3), and the email is sent to the receiver's email address (S4).

As another embodiment, Video Data Storage Area 206*w* and Screen Shot Data Storage Area 206*x* may be omitted, and the recorded TV program (i.e., channel data) may be retrieved directly from Video Data Storage Area 206*o* (FIGS. 106 and/or 116) and the screen shot data may be retrieved directly from Screen Shot Data Storage Area 206*r* (FIG. 110).

<<Cellular TV—EZ Recording Function>>

FIGS. 124 through 126 illustrate the EZ recording function, which is an improvement of the function of the timer video recording illustrated in FIGS. 113 through 118. The EZ recording function provides an easy and convenient method to input some of the items displayed on LCD 201 (FIG. 1), i.e., the channel number to be recorded, the start time from which the recording should be started (including day, date, and time), the stop time until which the recording should be continued (including day, date, and time).

FIG. 124 illustrates the method to input the above mentioned items utilizing the EZ recording function. As illustrated in FIG. 124, a TV listing which presents the channel number, the time from which the TV program starts and the time until which the TV program continues is displayed on LCD 201. For example, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. In the present example, the cursor is located on TV Program Pr 2.

FIG. 125 illustrates the software program to implement the EZ recording function. First of all, the TV program which is to be recorded is selected by moving the cursor displayed on LCD 201 (FIG. 1). In the present example shown in FIG. 124, the cursor currently located on TV Program Pr 2 can be moved up and highlight TV Program Pr 1, or instead moved down and highlight TV Program Pr 3. The cursor can move left and highlight TV Program Pr 4. The highlighted TV program is the object of the EZ recording function, and when a specific key is entered by utilizing Input Device 210 (FIG. 1) or via voice recognition system, CPU 211 (FIG. 1) stores the channel number, the start time, and the stop time in Timer Data Storage Area 206*t* as described in FIG. 118. In the present example shown in FIG. 124, CPU 211 stores Channel 1 as the channel number, 7:00 p.m. as the start time, and 8:00 p.m. as the stop time in Area 206*t*1 of Timer Data Storage Area 206*t* (S1). Next, the mode is selected (S2). The mode represents the high quality mode, the standard mode, the 'x3 mode' and the 'x6 mode'. Here, the high quality mode records the selected TV program (i.e., channel data) with the best quality, however, the available length of time to record is limited. The standard mode records the selected TV program with the standard quality, and the available length of time to record is fairly long. The 'x3 mode' records the selected TV program with lesser quality compared to the standard mode, however, the available length of time to record is fairly long compared to the standard mode. The 'x6 mode' records the selected TV program with lesser quality compared to the 'x3 mode', however, the available length of time to record is fairly long compared to the 'x3 mode' as described in FIG. 113. The method of selecting the mode is same to the one explained in S4 of FIG. 114. The sequence of S1 and S2 can be repeated, and has the same function of the software program explained in FIG. 114, namely a plurality of TV programs can be timer recorded simultaneously (S3). In the example explained in FIG. 124, TV programs Pr 1, Pr 4, and Pr 6 can be timer recorded simultaneously. All the relevant data are stored in Timer Data Storage Area 206*t*. Once setting the channel number, the start time, the stop time, and the mode are selected by the above mentioned method, CPU 211 (FIG. 1) starts the timer mode. By way of starting the timer mode, the software program explained in FIG. 115 is initiated (S4).

FIG. 126 illustrates the data stored in TV Server TVS (FIGS. 88, 89 and/or 90). As described in FIG. 126, TV Server TVS contains TV Listing Storage Area TVS 7 to store the updated data of the TV listings which are displayed on LCD 201 (FIG. 1) on demand.

<<Cellular TV—Subtitle Displaying Function>>

FIGS. 127 through 131*b* illustrate the function to display subtitles on LCD 201 (FIG. 1) of Communication Device 200 (FIG. 1).

As illustrated in FIG. 127, Subtitle ST is shown on the lower portion of LCD 201 (FIG. 1) when TV screen is displayed thereon.

FIG. 128 illustrates the software program to implement the function to display Subtitle ST on LCD 201 (FIG. 1). When specific signal is input by utilizing Input Device 210 (FIG. 1) or via voice recognition system indicating to display Subtitle ST (S1), CPU 211 (FIG. 1) retrieves a series of subtitle data from RAM 206 (FIG. 1) and displays Subtitle ST on LCD 201 (FIG. 1).

FIG. 129 illustrates the relevant information stored in RAM 206 (FIG. 1) in order to implement the function to display Subtitle ST. As described in FIG. 129, TV Data Calculating Area 206*e* (FIG. 99) includes Subtitle Data Calculating Area 206*e*1 which stores the software program explained in FIG. 128. In addition, TV Data Storage Area 206*f* (FIG. 99) includes Subtitle Data Storage Area 206*f*1 which stores a plurality of text data which are designed to be displayed on LCD 201 (FIG. 1) after being processed by Video Processor 202 (FIG. 1). Two types of text data are stored, i.e., the text code data and the text image data. The text code data identifies the specific text, such as 'A', 'B', and 'C', and the text image data represents the image of each text of 'A', 'B', and 'C' which are to be displayed on LCD 201.

FIG. 130 illustrates the method to process the text data stored in Subtitle Data Storage Area 206*f*1 (FIG. 129) in order to be displayed on LCD 201 (FIG. 1). As described in FIG. 130, TV Data Processing Area 202*b* (FIG. 101) includes Subtitle Data Processing Area 202*b*1. First of all, a series of text code data are retrieved from Subtitle Data Storage Area 206*f*1 (FIG. 129) under the administration of CPU 211 (FIG. 1). Then a series of corresponding text image data are retrieved from Subtitle Data Storage Area 206*f*1 (FIG. 129) under the administration of CPU 211. The retrieved text image data are then transferred to Subtitle Data Processing Area 202*b*1. Subtitle Data Processing Area 202*b*1 processes the retrieved text image data to produce a series of real images (such as adding colors) and the processed images are displayed on LCD 201.

FIGS. 131*a* and 131*b* illustrate the information received in a wireless fashion via Antenna 218 (FIG. 1). The information can be received in a TDMA format. In the example described in FIG. 131*a*, three channel data, i.e., Channel Data 1, Channel Data 2, and Channel Data 3 are received in a wireless fashion via Antenna 218. When utilizing the TDMA format, each channel data and the corresponding subtitle data are divided in to packets, and each packet is transferred and received in turn as described in FIG. 131*a*. Namely, the first portion of Channel Data 1 (CH1*a*) and the first portion of the corresponding subtitle data (SD1*a*) are included in the first packet, the first portion of Channel Data 2 (CH2*a*) and the first portion of the corresponding subtitle data (SD2*a*) are included in the second packet, the first portion of Channel Data 3 (CH3*a*) and the first portion of the corresponding subtitle data (SD3*a*) are included in the third packet, the second portion of Channel Data 1 (CH1*b*) and the second portion of the corresponding subtitle data (SD1*b*) are included in the fourth packet, the second portion of Channel Data 2 (CH2*b*) and the second portion of the corresponding subtitle data (SD2*b*) are included in the fifth packet, and the second portion of Channel Data 3 (CH3*b*) and the second portion of the corresponding subtitle data (SD3*b*) are included in the sixth packet.

On the other hand, the information can be received in a CDMA format or FDMA format. Under these formats, channel data and the corresponding subtitle data can be transferred and received seamlessly compared to the TDMA format. In the example described in FIG. 131*b*, Channel Data CH1 and the corresponding Subtitle Data SD1, Channel Data CH2 and the corresponding Subtitle Data SD2, and Channel Data CH3 and the corresponding Subtitle Data SD3 are transferred and received simultaneously by utilizing CDMA and/or FDMA format.

<<Cellular TV—Pay Per View Function>>

FIGS. 132 through 134 illustrate the PPV (pay per view) function of Communication Device 200 (FIG. 1).

As illustrated in FIG. 132, TV Data Calculation Area 206*e* (FIG. 99) includes Decoder Storage Area 206*e*2, i.e., an area which stores a software program to decode a series of encoded channel data. TV Data Storage Area 206*f* (FIG. 99) includes Encoded TV Data Storage Area 206*f*2, i.e., an area which stores a series of encoded channel data received via Antenna 218 (FIG. 1) in a wireless fashion, and Authenticated TV Program Information Storage Area 206*f*3, i.e., an area which stores information regarding the authenticated TV programs.

FIG. 133 illustrates the sequence of the decoder stored in Decoder Storage Area 206*e*2 (FIG. 132). First of all, a specific TV program (i.e., channel data) is selected by utilizing Input Device 210 (FIG. 1) or via the voice recognition system (S1). The decoder then retrieves the information stored in Authenticated TV Program Information Storage Area 206*f*3 and identifies whether the selected TV program is authenticated (S2). If the selected TV program is authenticated, decoder decodes the encoded channel data stored in Encoded TV Data Storage Area 206*f*2 (FIG. 132) (S3). The decoded channel data is displayed on LCD 201 (FIG. 1) via Video Processor 202 (FIG. 1) (S4).

The software program illustrated in FIG. 134 updates the information stored in Authenticated TV Program Information Storage Area 206*f*3 (FIG. 132). The software program is stored in either TV Server TVS (FIG. 90) or Communication Device 200 (FIG. 1). First of all, the payment status of the monthly fee paid by the user of Communication Device 200 is checked periodically, for example at the end of each month (S1). If the monthly payment is not yet paid (S2), and the grace period (e.g., 10 days) for paying the monthly fee has already been expired (S3), the decoder stored in Decoder Storage Area 206*e*2 (FIG. 132) is erased therefrom and thereby PPV function is no longer available (S4). As another embodiment, the decoder can be frozen instead of being erased for future use.

PPV function applies to each TV program, i.e., authentication process applies to each TV program (i.e., channel data) and enables the TV program to be viewed on LCD 201 (FIG. 1) only when such TV program is authenticated. However, as another embodiment, PPV function can be applied to each channel number. For example, a whole channel number, such as Channel 3 in FIG. 124, can be blocked and enabled to be viewed by PPV function only when such channel is authenticated.

<<Cellular TV—Timer Video Recording Function (2)>>

FIG. 135 illustrates the second embodiment of the timer video recording function, i.e., the function to video record the TV programs (a plurality of channel data) at specified times of Communication Device 200 (FIG. 1). The primary difference between the timer video recording function illustrated in FIG. 135 (the second embodiment) and the one explained in FIGS. 113 through 118 (the first embodiment) is that the former stores the series of channel data in a personal computer which is a separate device from Communication Device 200 (FIG. 1) whereas the latter stores the series of channel data in Communication Device 200 itself.

In FIG. 135, Communication Device 200 is connected with Personal Computer PC via Network NT. Communication Device 200 and Network NT are electronically linked. Personal computer PC is a computer which is electronically linked to Network NT, such as the Internet. Communication Device 200 transfers to Personal Computer PC a set of Timer Video Recording Signal TVRS, the details of which is explained hereinafter.

FIGS. 113, 114, 115, 116, 117, 118, 124, and 125 are utilized to explain the present embodiment. More precisely, the concept explained in FIGS. 113, 114, 124, and 125 apply to Communication Device 200 (FIG. 1), and the concept explained in FIGS. 115, 116, 117, and 118 apply to Personal Computer PC (FIG. 135).

FIG. 113 illustrates the items which are input by utilizing Input Device 210 (FIG. 1) or via voice recognition system. As described in FIG. 113, the items are displayed on LCD 201, i.e., the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode'. Here, the high quality mode records the selected TV program (i.e., channel data) with the best quality, however, the available length of time to record is limited. The standard mode records the selected TV program with the standard quality, and the available length of time to record is fairly long. The 'x3 mode' records the selected TV program with lesser quality compared to the standard mode, however, the available length of time to record is fairly long compared to the standard mode. The 'x6 mode' records the selected TV program with lesser quality compared to the 'x3 mode', however, the available length of time to record is fairly long compared to the 'x3 mode'.

FIG. 114 illustrates the software program stored in Video Record Calculating Area 206*n* (FIG. 106) to specify the items described in FIG. 113. First of all, the channel number is selected by utilizing Input Device 210 (FIG. 1) or via voice recognition system (S1). Next, the start time (S2), the stop time (S3), and the mode (S4) are input and/or selected by utilizing Input Device 210 or via voice recognition system. Once the foregoing steps are completed, more series of S1 through S4 can be repeated as many as the user of Communication Device 200 desires (S5). Namely, the function of timer video recording enables to timer record more than one TV programs (a plurality of channel data).

Once the items described in FIG. 113 are identified, the items are incorporated into Timer Video Recording Signal TVRS and transferred to Personal Computer PC via Network NT as described in FIG. 135.

Personal Computer PC (FIG. 135) has an area therein to store the software program described in FIG. 115, which implements the timer video recording function. Once the timer video recording function is initiated by receiving Timer Video Recording Signal TVRS (FIG. 135) from Communication Device 200 via Network NT (S1), the CPU of Personal Computer PC checks the current time (S2). If the current time matches the start time retrieved from Timer Video Recording Signal TVRS (S3), then the CPU of Personal Computer PC identifies the channel number to be recorded and the mode selected of which the details are explained in FIG. 113 (S4), and initiates the recording process of the TV program (i.e., channel data) (S5). The CPU of Personal Computer PC continues the recording process until the current time matches the stop time retrieved from Timer Video Recording Signal TVRS (S6). The recording process is terminated when the current time matches the stop time (S7).

Personal computer PC (FIG. 135) has an area therein which is similar to Video Data Storage Area 206*o* described in FIG. 116. The area is divided into certain areas in order to store a plurality of channel data as described in FIG. 116. Just as the example presented in FIG. 116, the TV programs (a plurality of channel data) of channel numbers 1, 2, and 3 are stored in each area of Personal Computer PC (which corresponds to Areas **206*o*1, 206*o*2, and 206*o*3 in FIG. 116**). Since each area of Personal Computer PC is divided into certain areas and thereby enables to store a plurality of channel data, a plurality of channel data (more than one TV program) can be recorded simultaneously.

Personal computer PC (FIG. 135) has an area therein which is similar to Timer Data Storage Area **206*t* described in FIG. 117. All data are retrieved from Timer Video Recording Signal TVRS (FIG. 135). As described in FIG. 117**, the data regarding the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode' are stored in the area of Personal Computer PC.

The area explained in the previous paragraph is composed of two types of areas. The first area administers the current time, and the second area stores the items explained in FIG. 113. Here, the first area is a timer similar to Timer **206*t*4 in FIG. 118 and provides the current time to the CPU of Personal Computer PC (FIG. 135), which is utilized in S3 (initiation of the video recording) and S6 (termination of the video recording) of the flowchart described in FIG. 115. The second area is similar to Areas 206*t*1, 206*t*2, and 206*t*3 in FIG. 118. The areas of Personal Computer PC corresponding to Areas 206*t*1, 206*t*2, and 206*t*3 in FIG. 118 store the data regarding the channel number to be recorded, the start time from which the recording should be started (including day, date, and time), the stop time until which the recording should be continued (including day, date, and time), and the mode which represents the high quality mode, the standard mode, the 'x3 mode' and the 'x6 mode'. In other words, the area of Personal Computer PC corresponding to Area 206*t*1 stores the start time, the stop time, and the mode for Channel 1, the area of Personal Computer PC corresponding to Area 206*t*2 stores the start time, the stop time, and the mode for Channel 2, and the area of Personal Computer PC corresponding to Area 206*t*3 stores the start time, the stop time, and the mode for Channel 3**.

<<Cellular TV—Summary>>

The foregoing invention may be summarized as the following. A communication device comprising a TV monitoring system, a wireless communication system, and an antenna wherein said antenna receives a plurality of TV data which are displayed on a display means installed into said communication device, and said antenna also receives communication data which is necessary to operate said wireless communication system thereby enabling the user of said communication device to enjoy watching TV on said display means as well as utilizing said wireless communication system.

<<3D Video Game Function>>

FIGS. 136 through 144 illustrate the video game function of Communication Device 200 (FIG. 1).

As described in FIG. 136 Host H includes Host Game Data Storage Area Ha. In Host Game Data Storage Area Ha, a plurality of game data are stored for downloading purposes. Games G1, G2, G3, and G4 are stored in Host Game Data Storage Area Ha in the example illustrated in FIG. 136.

FIG. 137 illustrates the sequence to initiate the game function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example described in FIG. 137, the communication mode is activated (S**3*a*) when the communication mode is selected in the previous step, the game download mode is activated (S3*b*) when the game download mode is selected in the previous step, and the game play mode is activated (S3*c*) when game play mode is selected in the previous step. The modes displayed on LCD 201 in S1 which are selected and activated in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4). Here, communication mode is a mode which enables Communication Device 200 to communicate (i.e., send and/or receive audio data, text data, image data, video data, and/or other types of data in a wireless fashion via Antenna 218) in a wireless fashion with other Communication Devices 200 or with other devices in the manner, for example, described in FIGS. 2*a*, 2*b*, and 2*c***. The same meaning applies hereinafter.

FIG. 138 illustrates the data stored in RAM 206 (FIG. 1). As described in FIG. 138, the data to activate (as described in S**3*a* of the previous figure) and to perform the communication mode is stored in Communication Data Storage Area 2061*a*, the data to activate (as described in S3*b* of the previous figure) and to perform game download mode is stored in Game DL Data Storage Area 2061*b*, and the data to activate (as described in S3*c* of the previous figure) and to perform game play mode is stored in 2061*c***.

FIG. 139 illustrates the method of activating and deactivating the game mode by utilizing the voice recognition system explained hereinbefore. The voice recognition system is turned on, in the first place (S1), and the game mode is activated by utilizing the voice recognition system (S2). When utilizing the game mode is over, it is deactivated by utilizing the voice recognition system, and the system is turned off thereafter (S3).

FIG. 140 illustrates the sequence of downloading a game data, i.e., a game software program, from Host H (FIG. 136). As described in FIG. 140, a list of game data is displayed on LCD 201 (FIG. 1) (S1). When an input signal is input from Input Device 210 or by the voice recognition system to select a specific game data (S2), the selected game data is downloaded to Communication Device 200 and is stored in Game DL Data Storage Area **2061*b* (FIG. 138) (S3). The downloaded game data is decompressed thereafter by CPU 211 (FIG. 1**).

FIG. 141 illustrates the data stored in Game Play Data Storage Area **2061*c* (FIG. 138). The decompressed game data are allocated to the predetermined areas, i.e., Game Software Storage Area 2061*d*, 3D Object Data Storage Area 2061*e*, Texture Data Storage Area 2061*f*, and Game Process Data Storage Area 2061*g*. Here, Game Software Storage Area 2061*d* stores a series of software program to perform the game function of Communication Device 200. 3D Object Data Storage Area 2061*e* stores the three-dimensional data of the three-dimensional objects displayed on LCD 201 (FIG. 1), such as the shape of each three-dimensional object in a polygon form (or in a wire frame form), and the three-dimensional data of all parts (components) of each three-dimensional object. Texture Data Storage Area 2061*f* stores a plurality of data of textures which are 'pasted' on each three-dimensional object (or on each part thereof) when such three-dimensional object is displayed on LCD 201. Game Process Data Storage Area 2061*g* stores a plurality of data necessary to process the game software program, such as the strength and speed of each three-dimensional object, the layout of the background displayed on LCD 201, the weather described in the game, the property of each shadow displayed adjacent to the three-dimensional object, the movement of the objects which are controllable by the user of Communication Device 200, and the movement of the objects which are not controllable by the user of Communication Device 200**.

FIG. 142 illustrates the sequence of the game software program stored in Game Software Storage Area 2061*d* (FIG. 141). When the game mode is started by voice recognition system as described in S1 and S2 of FIG. 139, the game initiation process is initiated by CPU 211 (FIG. 1) (S1). Here, CPU 211 reads, by following the instructions written in the game software program stored in Game Software Storage Area 2061*d*, all the address data stored in 3D Object Data Storage Area 2061*e*, Texture Data Storage Area 2061*f*, and Game Process Data Storage Area 2061*g* to promptly retrieve the required data to process the game when necessary. During the game initiation process, an initiation screen is displayed on LCD 201. Once the game is started, CPU 211 checks the status of the input signal from Input Device 210 (FIG. 1) or by the voice recognition system. If an input signal is detected (S2), a response to such input signal is processed by CPU 211 by retrieving data from Game Process Data Storage Area 2061*g* (FIG. 141) (S3). For example, if the input signal instructs to move forward the three-dimensional object, CPU 211 calculates the next action of its body parts (e.g., pushing forward its right leg) by retrieving data from Game Process Data Storage Area 2061*g*. CPU 211 also processes with the three-dimensional objects which are irrelevant to the input signal input from Input Device 210 by retrieving data from Game Process Data Storage Area 2061*g*, for example the background objects displayed on LCD 201 including, clouds, pedestrians, buildings, traffic lights, and bridges (S4). CPU 211 also calculates the three-dimensional data of each three-dimensional object and the three-dimensional data of all parts thereof in the three-dimensional game space by retrieving data from three-dimensional object Data Storage Area 2061*e* (S4). CPU 211 then retrieves the designated textures from Texture Data Storage Area 2061*f* (FIG. 141) and 'pastes' them to the three-dimensional objects (S4). The three-dimensional objects with textures 'pasted' are displayed on LCD 201 (S5). The sequence of S2 through S5 is repeated until the game is over (S6), and the game termination process, i.e., a process to terminate the game mode is initiated thereafter (S7).

FIGS. 143 and 144 illustrate the process to allocate Input Device 210 (FIG. 1) to perform the game function. As described in FIG. 143, when the game initiation process is initiated as explained in S1 of FIG. 142, the key allocation process is initiated simultaneously. As the result of the key allocation process, Input Device 210 normally utilized for communication purposes, including keypad and buttons, is allocated as input means for performing the game function. In the example described in FIG. 144, Key #1 is assigned for instructing CPU 211 to move up the three-dimensional object, Key #2 is assigned for instructing CPU 211 to move down the three-dimensional object, Key #3 is assigned for instructing CPU 211 to move left the three-dimensional object, Key #4 is assigned for instructing CPU 211 to move right the three-dimensional object, Key #5 is assigned for instructing CPU 211 to make the three-dimensional object to jump, and Key #6 is assigned for instructing CPU 211 to make the three-dimensional object to dash, and all the foregoing data are stored in Key Allocation Data Storage Area 2061*h*.

<<3D Video Game Function—Summary>>

The foregoing invention may be summarized as the following.

A wireless communication device comprising an input means to operate said wireless communication device, a microphone to input audio data to said wireless communication device, a speaker to output audio data from said wireless communication device, a video image generator to generate a plurality of images, and a display to display said plurality of images, wherein said video image generator functions under a first mode and a second mode, said video image generator processes a plurality of two-dimensional images and said plurality of two-dimensional images are displayed on said display under said first mode, and said video image generator processes a plurality of three-dimensional images and said plurality of three-dimensional images are displayed on said display under said second mode.

<<Digital Mirror Function (2)>>

FIGS. 145 through 155 illustrate the second embodiment of digital mirror function of Communication Device 200 (FIG. 1).

FIG. 145 illustrates the sequence to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the CCD mode is activated (S3*c*) when the CCD mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 146 illustrates the data stored in RAM 206 (FIG. 1). As described in FIG. 146, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the CCD mode is stored in 2062*a*.

FIG. 147 illustrates the data stored in CCD Data Storage Area 2062*a* (FIG. 146). CCD Data Storage Area 2062*a* includes two areas, i.e., CCD Software Storage Area 2062*b* and CCD Video Data Storage Area 2062*c*. CCD Software Storage Area 2062*b* stores a software program which implements the digital mirror function, and CCD Video Data Storage Area 2062*c* stores a series of video data input from CCD Unit 214 (FIG. 1) in a digital format for purposes of being displayed on LCD 201 (FIG. 1) and/or being sent to another Communication Device 200 via Antenna 218 (FIG. 1) in a wireless fashion.

As described in FIG. 148, CCD Video Data Storage Area 2062*c* includes two areas, i.e., 1st Video Data Storage Area 2062*d* and 2nd Video Data Storage Area 2062*e* of which the function of each area is described in details hereinafter. The series of video data stored in both areas are similar to each other.

FIG. 149 illustrates the method of activating and deactivating the CCD mode by utilizing the voice recognition system explained hereinbefore. The voice recognition system is turned on, in the first place (S1), and the CCD mode is activated by utilizing the voice recognition system (S2). When utilizing the CCD mode is over, it is deactivated by utilizing the voice recognition system, and the system is turned off thereafter (S3).

FIGS. 150 through 153 illustrate the utilization of the two areas of CCD Video Data Storage Area 2062*c* (FIG. 148), i.e., 1st Video Data Storage Area 2062*d* and 2nd Video Data Storage Area 2062*e*. As described in FIG. 150, video data is input from CCD Unit 214 (FIG. 1) (S1), and is stored in 1st Video Data Storage Area 2062*d* (S2). While the sequence described in FIG. 150 is performed, the video data already stored in 2nd Video Data Storage Area 2062*e* is read (S1), and is displayed on LCD 201 (FIG. 1) as described in FIG. 151. Once reading the video data from 2nd Video Data Storage Area 2062*e* is completed, a new video data is input from CCD Unit 214 (S1) and is stored in 2nd Video Data Storage Area 2062*e* (S2) as described in FIG. 152. While the sequence described in FIG. 152 is performed, the video data already stored in 1st Video Data Storage Area 2062*d* is read (S1), and is displayed on LCD 201 (FIG. 1) as described in FIG. 153. The foregoing sequence is administered by CPU 211 (FIG. 1) under the instruction written in the software program stored in CCD Software Storage Area 2062*b* (FIG. 147).

FIG. 154 is a summary of the sequence of writing and reading video data to and from 1st Video Data Storage Area 2062*d* and 2nd Video Data Storage Area 2062*e*, respectively. When 1st Video Data Storage Area 2062*d* is utilized for writing a new video data, 2nd Video Data Storage Area 2062*e* is utilized for reading the video data already stored therein. Once reading video data from 2nd Video Data Storage Area 2062*e* is completed, it is then utilized for writing a new video data, and 1st Video Data Storage Area 2062*d* is utilized for reading the video data already stored therein. In other words, 1st Video Data Storage Area 2062*d* repeats the sequence of writing and reading video data whereas 2nd Video Data Storage Area 2062*e* repeats the sequence of reading and writing until the present function ceases to be utilized. Namely, 1st Video Data Storage Area 2062*d* is always in a writing mode when 2nd Video Data Storage Area 2062*e* is in a reading mode, and 2nd Video Data Storage Area 2062*e* is always in a writing mode when 1st Video Data Storage Area 2062*d* is in a reading mode.

FIG. 155 illustrates the sequence of implementing the digital mirror function. As described in FIG. 155, CPU 211 (FIG. 1) checks the angle of Rotator 291 (FIG. 44*c*) (S1). If the angle of Rotator 291 is within the range of x degree and y degree, i.e., when CCD Unit 214 (FIG. 44*c*) is facing the opposite direction from LCD 201 (FIG. 1) (S2), the video data stored in 1st Video Data Storage Area 2062*d* (FIG. 148) and 2nd Video Data Storage Area 2062*e* (FIG. 148) are read from left to right, i.e., in the manner described in FIG. 44*d* (S3*a*). On the other hand, if the angle of Rotator 291 is not within the range of x degree and y degree, i.e., when CCD Unit 214 is facing approximately the same direction with LCD 201 or facing the user of Communication Device 200 (S2), the video data stored in 1st Video Data Storage Area 2062*d* and 2nd Video Data Storage Area 2062*e* are read from right to left, i.e., in the manner described in FIG. 44*e*, which produces a 'mirror image' on LCD 201 (S3*b*). Even though a 'mirror image' is produced on LCD 201, the video data which is sent to another Communication Device 200 via Antenna 218 (FIG. 1) in a wireless fashion is not inverted and is always read from left to right as described in FIG. 44*d*. Not to mention, the video data transmitted to another communication device may send a series of inverted video data by utilizing the method described in FIG. 44*e*.

<<Voice Recognition Sys—E-mail (2)>>

FIGS. 156 through 160 illustrate the second embodiment of typing and sending e-mails by utilizing the voice recognition system.

FIG. 156 illustrates the sequence to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the e-mail producing mode is activated (S3*c*) when the e-mail producing mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 157 illustrates the data stored in RAM 206 (FIG. 1). As described in FIG. 157, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the e-mail producing mode is stored in E-mail Data Storage Area 2063*a*.

FIG. 157*a* illustrates the data stored in E-mail Data Storage Area 2063*a*. E-mail Data Storage Area 2063*a* includes E-mail Software Storage Area 2063*b* and E-mail Producing Data Storage Area 2063*c*. E-mail Software Storage Area 2063*b* stores software program to implement the e-mail producing mode, and E-mail Producing Data Storage Area 2063*c* stores a plurality of data regarding email, both of which are explained in details hereinafter.

FIG. 158 illustrates the method of activating and deactivating the e-mail producing mode by utilizing the voice recognition system explained hereinbefore. The voice recognition system is turned on, in the first place (S1), and the e-mail producing mode is activated by utilizing the voice recognition system (S2). When utilizing the e-mail producing mode is over, it is deactivated by utilizing the voice recognition system, and the system is turned off thereafter (S3).

FIG. 159 illustrates the sequence of the e-mail producing mode explained in FIG. 158. First of all, CPU 211 (FIG. 1), by operation of the software program stored in E-mail Software Storage Area 2063*b* (FIG. 157*a*), displays on LCD 201 (FIG. 1) the items which the user of Communication Device 200 should fill in (S1). Here, the items displayed in the present example are the receiver's e-mail address, CC (carbon copy), subject of the e-mail, and the main body text of the e-mail. Next, one of these items is selected by the voice recognition system (S2). If the receiver's e-mail address is selected in the previous step, the user of Communication Device 200 inputs the receiver's e-mail address by utilizing Input Device 210 (FIG. 1) or via voice recognition system (S3*a*). If CC (carbon copy) is selected in the previous step, the user of Communication Device 200 inputs an e-mail address to which the e-mail is sent other than the receiver's e-mail address by utilizing the voice recognition system (S3*b*). If the subject of the e-mail is selected in the previous step, the user of Communication Device 200 inputs the subject of the e-mail by utilizing the voice recognition system (S3*c*). If the main body text of the e-mail is selected in the previous step, the user of Communication Device 200 inputs the main body text of the e-mail by utilizing the voice recognition system (S3*d*). The user of Communication Device 200 can fill in a portion of one item and go to another item, and come back to the previous one to finish filling out the item (S4). All the input data are stored in E-mail Producing Data Storage Area 2063*c* (FIG. 157*a*).

FIG. 160 illustrates the sequence of inputting alphanumeric information to each item explained in FIG. 159. First of all, analog audio data is input via Microphone 215 (FIG. 1) (S1). Analog audio data is converted into digital audio data by A/D 213 (FIG. 1) (S2). The digital audio data is processed by Sound Processor 205 (FIG. 1) to convert the digital audio data in a CPU readable form (S3). Then CPU 211 (FIG. 1) retrieves alphanumeric information therefrom (S4), which is displayed on LCD 201 (FIG. 1) and emitted as sound data from Speaker 216 (FIG. 1) (S5). If the retrieved alphanumeric information is not correct (S6), the user can input the correct alphanumeric information manually by utilizing Input Device 210 (FIG. 1), such as a keypad or a dial pad, and the corrected alphanumeric information is displayed on LCD 201 and emitted as sound data from Speaker 216 (S7). The sequence of S1 through S7 is repeated until termination signal by utilizing the voice recognition system is input via Microphone 215 (S8).

The method of sending the produced e-mail is same as the one already explained in FIG. 17*a* and FIG. 17*b*.

<<Positioning System—GPS Search Engine>>

FIGS. 161 through 169*b* illustrate the GPS search engine function, i.e., the method to search a location by a specific criteria and display such location on a map and a direction thereto on LCD 201 (FIG. 1).

FIG. 161 illustrates the data stored in Host H. As described in FIG. 161, Host H includes Search Engine Storage Area Hb, Location Identifier Storage Area Hc, and Database Storage Area Hd. Here, the software program stored in Search Engine Storage Area Hb is a searching software program to search Database Storage Area Hd with a specific criteria, a data base stored in Database Storage Area Hd is a database which stores a plurality of data and information as described in FIG. 166, and the software program stored in Location Identifier Storage Area Hc is a software program to identify the geographical location of the specific sites, Communication Device 200 and other objects.

FIG. 162 illustrates the sequence to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the search mode is activated (S3*c*) when the search mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 163 illustrates the data stored in RAM 206 (FIG. 1). As described in FIG. 163, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the search mode is stored in Search Data Storage Area 2064*a*.

FIG. 164 illustrates the method to store the wireless data to the relevant storage area in RAM 206 (FIG. 1). A wireless signal is received via Antenna 218 (FIG. 1) (S1). The received wireless signal is decompressed and converted into a CPU readable format by Signal Processor 208 (FIG. 1), and CPU 211 (FIG. 1) reads the header or the title of the data to identify its data-type in order to determine the location at which the data is stored (S2). According to the identified data-type, communication data is stored in Communication Storage Area 2061*a* (S3*a*), game DL data and game play data area stored in Game DL/Play Data Storage Area 2061*b*/2061*c* (S3*b*), and search data is stored in Search Data Storage Area 2064*a* (S3*c*). The sequence of S1 through S3 is repeated endlessly in order to enable to receive and store multiple types of data simultaneously. For example, the first portion of search data is processed as described in S3*c* while the first portion of communication data is processed as described in S3*a*, and the second portion of search data is processed as described in S3*c* while the first portion of game DL data is processed as described in S3*b*. The wireless signal received via Antenna 218 may be in TDMA format, FDMA format, and/or CDMA format.

FIG. 165 illustrates the data stored in Search Data Storage Area 2064*a* (FIG. 163). Search Data Storage Area 2064*a* includes Search Software Storage Area 2064*b* and Search Information Storage Area 2064*c*. Search Software Storage Area 2064*b* stores a software program to operate Communication Device 200 in order to implement the search described herein the details of which is explained in FIGS. 168*a* through 169*b*. Search Information Storage Area 2064*c* stores the data received by the process explained in S3*c* of FIG. 164 such as, search results, communication log with Host H (FIG. 161), and all necessary information to perform the software program stored in Search Software Storage Area 2064*b*.

FIG. 166 illustrates the data stored in Database Storage Area Hd (FIG. 161). Database Storage Area Hd is primarily composed of five categories, i.e., type, keyword, telephone number, geographical location, and attribution information. In the present example explained in FIG. 166, the category 'Type' represents the type of the site and Stores St1 and St2, Restaurants Rt1 and Rt2, Theaters Th1 and Th2, Lodges Lg1 and Lg2, Railway Stations Rst1, Rst2, Rst3, and Rst4, and Gas Stations Gst1 and Gst2 are registered under the category 'Type'. One or more of keywords which represent the character of the site is allocated to each site under the category 'Keyword'. The corresponding telephone number of each site is stored under the category 'Tel'. The location of each site is stored in [x, y, z] format under the category 'Loc'. The attribution information of each site is stored under the category 'Att. Info'. Here, the attribution information of Stores St1 and St2 are the names of the goods sold and the prices thereof, the date of bargain, and the business hours. The attribution information of Restaurants Rt1 and Rt2 are the price of meal provided, and the business hours. The attribution information of theater Th1 and Th2 are the title of movie shown, the business hours, and the price of tickets sold. The attribution information of Lodges Lg1 and Lg2 are the lodging fee, the types of rooms and beds provided, and the cancellation policy. The attribution information of Railway Stations Rst1, Rst2, Rst3, and Rst4 are the time schedule of each train, and ticket price for each destination. The attribution information of Gas Stations Gst1 and Gst2 are the gas price per gallon and the retail hours. The example illustrated in FIG. 166 is a simplified model of this function in order to avoid complexity in its explanation, therefore, the preferable amount of sites registered in Database Storage Area Hd is more than few thousand to retrieve a satisfying result to the user of Communication Device 200. Database Hd also includes 3D Map Storage Area Hd1 to store a plurality of three-dimensional map data of all geographic locations which is designed to be displayed on LCD 201 (FIG. 1) of Communication Device 200. As another embodiment, the data stored in Database Storage Area Hd can be stored in Search Information Storage Area 2064*c* (FIG. 165) of Communication Device 200 instead.

FIG. 167 illustrates the method of activating and deactivating the search mode by utilizing the voice recognition system explained hereinbefore. The voice recognition system is turned on, in the first place (S1), and the search mode is activated by utilizing the voice recognition system (S2). When utilizing search mode is over, it is deactivated by utilizing the voice recognition system, and the system is turned off thereafter (S3).

FIG. 167*a* illustrates the software program stored in Search Software Storage Area 2064*b* (FIG. 165) of Communication Device 200. As described in FIG. 167*a*, a list of five categories, i.e., type, keyword, telephone number, geographical location, and attribution information is displayed on LCD 201 (FIG. 1) (S1). The user of Communication Device 200 selects one of the categories for searching purposes by utilizing the voice recognition system (S2).

FIG. 168*a* illustrates the software program stored in Search Software Storage Area 2064*b* (FIG. 165) of Communication Device 200 and the software program stored in Location Identifier Storage Area Hc (FIG. 161) and Search Engine Storage Area Hb (FIG. 161) of Host H (FIG. 161) when, as an example, 'keyword' is selected from the categories displayed on LCD 201 (FIG. 1) as described in FIG. 167*a*. Once the voice recognition system is activated by the process described in FIG. 167, a prompt screen (not shown) is displayed on LCD 201 and keyword is input via Microphone 215 (FIG. 1) (S1). The keyword data is sent to Host H via Antenna 218 (FIG. 1) in a wireless fashion, and the software program stored in Search Engine Storage Area Hb scans the 'Keyword' category and collects the result, i.e., a bundle of proposed sites (S2). The collected result is sent from Host H to Communication Device 200 in a wireless fashion and is displayed on LCD 201 (S3). The user of Communication Device 200, by utilizing the voice recognition system, selects one of the proposed sites as his/her destination (S4). CPU 211 (FIG. 1), under the instruction written in Search Software Storage Area 2064*b*, calculates the current position of Communication Device 200 (S5). The data retrieved in S4 and S5 are sent to Host H in a wireless fashion and the software program stored in Location Identifier Storage Area Hc calculates the distance and the shortest route from the current position of Communication Device 200 to the selected site (i.e., destination) and retrieves a relevant 3D map from 3D Map Storage Area Hd1 (FIG. 166) (S6). Communication Device 200 receives these data from Host H, and LCD 201 displays the current position and the selected site (i.e., destination) and the shortest route thereto on a 3D map, and the distance from the current position to the selected item (i.e., destination) in digits (S7).

FIG. 168*b* illustrates an embodiment of the software program stored in Search Software Storage Area 2064*b* (FIG. 165) of Communication Device 200 without relying to Host H (FIG. 161). In this embodiment, the data stored in Database Hd (FIG. 166) of Host H is also stored in Search Information Storage Area 2064*c* (FIG. 165) of Communication Device 200. Once the voice recognition system is activated by the process described in FIG. 167, a prompt screen (not shown) is displayed on LCD 201 (FIG. 1) and keyword is input via Microphone 215 (FIG. 1) (S1). The software program stored in Search Software Storage Area 2064*b* (FIG. 165) scans the 'Keyword' category of the database stored in Search Information Storage Area 2064*c* and collects the result, i.e., a bundle of proposed sites (S2). The collected result is displayed on LCD 201 (S3). The user of Communication Device 200, by utilizing the voice recognition system, selects one of the proposed sites as his/her destination (S4). CPU 211 (FIG. 1), under the instruction written in Search Software Storage Area 2064*b*, calculates the current position of Communication Device 200 (S5). The software program stored in Search Software Storage Area 2064*b* calculates the distance and the shortest route from the current position of Communication Device 200 to the selected site (i.e., destination) and retrieves a relevant 3D map from Search Information Storage Area 2064*c* (S6). LCD 201 displays the current position and the selected site (i.e., destination) and the shortest route thereto on a 3D map, and the distance from the current position to the selected item (i.e., destination) in digits (S7).

FIG. 169*a* illustrates another embodiment similar to the one explained in FIG. 168*a* which utilizes the software program stored in Search Software Storage Area 2064*b* (FIG. 165) of Communication Device 200 and the software program stored in Location Identifier Storage Area Hc (FIG. 161) and Search Engine Storage Area Hb (FIG. 161) of Host H (FIG. 161). Once the voice recognition system is activated by the process described in FIG. 167, a prompt screen (not shown) is displayed on LCD 201 (FIG. 1) and keyword is input via Microphone 215 (FIG. 1) (S1). The keyword data is sent to Host H via Antenna 218 (FIG. 1) in a wireless fashion, and the software program stored in Search Engine Storage Area Hb scans the 'Keyword' category and collects the result, i.e., a bundle of proposed sites (S2). CPU 211 (FIG. 1), under the instruction written in Search Software Storage Area 2064*b*, calculates the current position of Communication Device 200 (S3). The data retrieved in S2 and S3 are sent to Host H in a wireless fashion and the software program stored in Location Identifier Storage Area Hc calculates the distance and the shortest route from the current position of Communication Device 200 to the proposed sites and retrieves a relevant 3D map from 3D Map Storage Area Hd1 (FIG. 166) (S4). Communication Device 200 receives these data from Host H, and LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the final destination (i.e., destinations) in digits (S7).

FIG. 169*b* illustrates another embodiment of the software program stored in Search Software Storage Area 2064*b* (FIG. 165) of Communication Device 200 without relying to Host H (FIG. 161). Once the voice recognition system is activated by the process described in FIG. 167, a prompt screen (not shown) is displayed on LCD 201 (FIG. 1) and keyword is input via Microphone 215 (FIG. 1) (S1). The software program stored in Search Software Storage Area 2064*b* scans the 'Keyword' category and collects the result, i.e., a bundle of proposed sites (S2). CPU 211 (FIG. 1), under the instruction written in Search Software Storage Area 2064*b*, calculates the current position of Communication Device 200 (S3). The software program stored in Search Software Storage Area 2064*b* calculates the distance and the shortest route from the current position of Communication Device 200 to the proposed sites and retrieves a relevant 3D map from Search Information Storage Area 2064*c* (FIG. 165) (S4). LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the selected site (i.e., destinations) in digits (S7).

The sequences illustrated in FIGS. 168*a* through 169*b* which describe the database search utilizing keywords can be applied to other types of database search. For example, search by 'Type' will collect all sites pertaining to a certain type (e.g., theater), and search by 'Location' will collect all sites pertaining to a certain geographical area. Search by 'Telephone Number' will collect all sites having a certain phone number (there is only one hit in most cases unless a wild card is utilized), and search by 'Area Code' will collect all sites having a certain area code. These examples can be implemented by rewriting S1 of FIGS. 168*a* through 169*b* to 'Input Type', 'Input Location', 'Input Telephone Number', or 'Input Area Code'.

As another embodiment, more than one search terms can be utilized simultaneously, such as 'Input Type and Location' (which collects all sites pertaining to a certain type and to a certain geographical area) and 'Input Area Code and Type' (which collects all sites having a certain area code and pertains to a certain type of site). Theses examples can be implemented by rewriting S1 of FIGS. 168*a* through 169*b* to 'Input Type and Location' and 'Input Area Code and Type'.

FIGS. 169*c* and 169*d* illustrate the steps to find an appropriate gas station while the user of Communication Device 200 is driving an automobile.

FIG. 169*c* illustrates the steps to find an appropriate gas station by utilizing the software program stored in Search Software Storage Area 2064*b* (FIG. 165) of Communication Device 200 and the software program stored in Location Identifier Storage Area Hc (FIG. 161) and Search Engine Storage Area Hb (FIG. 161) of Host H (FIG. 161). Once the voice recognition system is activated by the process described in FIG. 167, a prompt screen (not shown) is displayed on LCD 201 (FIG. 1) and the 'type' (here, 'gas station') is input or selected via Microphone 215 (FIG. 1) (S1). Next, the user of Communication Device 200 selects the scope of search from (a) nearest gas station, (b) cheapest gas station, (c) gas station within 1 mile, and (d) gas station within 5 miles, all of which are displayed on LCD 201 (S2). The selected data is sent to Host H via Antenna 218 (FIG. 1) in a wireless fashion, and the software program stored in Location Identifier Storage Area Hc calculates the current position of Communication Device 200 (S3). The software program stored in Search Engine Storage Area Hb renders a search and collects the result, i.e., a bundle of proposed gas stations (S4). For example, if (a) nearest gas station is selected in S2, the software program stored in Search Engine Storage Area Hb collects the five nearest gas stations from the current position by examining the geographic location data of each gas station stored in Database Hd. If (b) cheapest gas station is selected in S2, the software program stored in Search Engine Storage Area Hb collects all gas stations within 5 mile radius from the current position by examining the geographic location of each gas station stored in Database Hd, and selects the five cheapest gas stations therefrom by examining the attribution information (i.e., gas price per gallon) of each gas station stored in Database Hd. If (c) gas station within 1 mile is selected in S2, the software program stored in Search Engine Storage Area Hb collects all gas stations within 1 mile radius from the current position by examining the geographic location of each gas station stored in Database Hd. If (d) gas station within 5 miles is selected in S2, the software program stored in Search Engine Storage Area Hb collects all gas stations within 5 mile radius from the current position by examining the geographic location of each gas station stored in Database Hd. Communication Device 200 receives these data from Host H, and LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the final destination (i.e., destinations) in digits (S7).

FIG. 169*d* illustrates the steps to find an appropriate gas station by utilizing the software program stored in Search Software Storage Area 2064*b* (FIG. 165) of Communication Device 200 without relying to Host H (FIG. 161). Once the voice recognition system is activated by the process described in FIG. 167, a prompt screen (not shown) is displayed on LCD 201 (FIG. 1) and the 'type' (here, 'gas station') is input or selected via Microphone 215 (FIG. 1) (S1). Next, the user of Communication Device 200 selects the scope of search from (a) nearest gas station, (b) cheapest gas station, (c) gas station within 1 mile, and (d) gas station within 5 miles, all of which are displayed on LCD 201 (S2). CPU 211 (FIG. 1), under the instruction written in Search Software Storage Area 2064*b*, calculates the current position of Communication Device 200 (S3). CPU 211 renders a search and collects the result, i.e., a bundle of proposed gas stations (S4). For example, if (a) nearest gas station is selected in S2, the software program stored in Search Engine Storage Area Hb collects the five nearest gas stations from the current position by examining the geographic location data of each gas station stored in Database Hd. If (b) cheapest gas station is selected in S2, the software program stored in Search Engine Storage Area Hb collects all gas stations within 5 mile radius from the current position by examining the geographic location of each gas station stored in Database Hd, and selects the five cheapest gas stations therefrom by examining the attribution information (i.e., gas price per gallon) of each gas station stored in Database Hd. If (c) gas station within 1 mile is selected in S2, the software program stored in Search Engine Storage Area Hb collects all gas stations within 1 mile radius from the current position by examining the geographic location of each gas station stored in Database Hd. If (d) gas station within 5 miles is selected in S2, the software program stored in Search Engine Storage Area Hb collects all gas stations within 5 mile radius from the current position by examining the geographic location of each gas station stored in Database Hd. LCD 201 displays the current position and the positions of the proposed sites and the shortest route thereto on a 3D map, and the distance from the current position to the selected items (i.e., destinations) in digits (S5). The user of Communication Device 200, by utilizing the voice recognition system, selects one of the proposed sites as the destination (S6). LCD 201 displays the current position and the selected site (i.e., destination) and the shortest route thereto on a 3D map, and the distance from the current position to the final destination (i.e., destinations) in digits (S7).

<<Positioning System—Automobile Pinpointing System>>

FIGS. 170 through 179 illustrate the automobile pin-pointing system, i.e., a system to pin-point the geographical location of an automobile with Communication Device 200 by utilizing the positioning system (GPS) installed therein. The concept of positioning system which has already been explained hereinbefore is also applicable to the present system.

As described in FIG. 170, GPS Navigation System 835*a* is installed in Automobile 835. Here, GPS Navigation System 835*a* is capable of receiving GPS signals which is sent from artificial satellites or from their equivalents (e.g., Relays R1 through R20 in FIGS. 20*a* and 20*b*) for purposes of identifying the geographical location of Automobile 835. GPS Navigation System 835*a* is capable of transmitting (i.e., forwarding) the GPS signals received from the artificial satellites (or from their equivalents) to Host H (not shown) in order for Host H to calculate the current position of Automobile 835. GPS Navigation System 835*a* is also capable of calculating the current position of Automobile 835 by utilizing the information included in the GPS signals and capable of transmitting its location data in a wireless fashion.

FIG. 171 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the automobile find mode is activated (S3*c*) when the automobile find mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 172 illustrates the data stored in RAM 206 (FIG. 1). As described in FIG. 172, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the automobile find mode is stored in Automobile Find Data Storage Area 2065*a*.

FIG. 173 illustrates the method to store the wireless data to the relevant storage area in RAM 206 (FIG. 1). A wireless signal is received via Antenna 218 (FIG. 1) (S1). The received wireless signal is decompressed and converted into a CPU readable format by Signal Processor 208 (FIG. 1), and CPU 211 (FIG. 1) reads the header or the title of the data to identify its data-type in order to determine the location at which the data is stored (S2). According to the identified data-type, communication data is stored in Communication Storage Area 2061*a* (S3*a*), game DL data and game play data area stored in Game DL/Play Data Storage Area 2061*b*/2061*c* (S3*b*), and automobile find data is stored in Search Data Storage Area 2065*a* (S3*c*). The sequence of S1 through S3 is repeated endlessly in order to enable to receive and store multiple types of data simultaneously. For example, the first portion of automobile find data is processed as described in S3*c* while the first portion of communication data is processed as described in S3*a*, and the second portion of automobile find data is processed as described in S3*c* while the first portion of game DL data is processed as described in S3*b*. The wireless signal received via Antenna 218 may be in TDMA format, FDMA format, and/or CDMA format.

FIGS. 174 through 179 illustrate the method to identify the current position of Automobile 835 (FIG. 170) by Communication Device 200, which is located somewhere in the matrix of relays illustrated in FIG. 20*b*. Here, the matrix of relays illustrated in FIG. 20*b* is equivalent to GPS artificial satellite. Assuming that Communication Device 200 seeks to detect the current position of Automobile 835.

As described in FIG. 174, first of all an automobile ID of Automobile 835 (FIG. 170) is entered by utilizing Input Device 210 (FIG. 1) or via voice recognition system (S1). As another embodiment, a list of automobile IDs may be listed on LCD 201 (FIG. 1), and the user of Communication Device 200 may select one by utilizing Input Device 210 or via voice recognition system instead. The automobile ID may be Automobiles 835 corresponding phone number or the license number allocated thereto. A request data including the automobile ID is sent to Host H (not shown) from Communication Device 200 (S2).

As illustrated in FIG. 175, Host H (not shown) periodically receives data from Communication Device 200 (S1). If the received data is a request data (S2), Host H first of all searches its communication log which records the location of Automobile 835 (FIG. 170) when it last communicated with Host H (S3). Then Host H sends a search signal from the relays described in FIG. 20*b* which are located within 100 meter radius from the location registered in the communication log. If there is no response from Automobile 835 (S5), Host H sends search signal from all relays (e.g., from R1 to R20 in FIG. 20*b*) to search for Automobile 835 (FIG. 170) (S6).

As illustrated in FIG. 176, Automobile 835 (FIG. 170) periodically receives data from Host H (not shown) (S1). If the data received is a search signal (S2), Automobile 835 sends a response signal to Host H (S3).

As illustrated in FIG. 177, Host H (not shown) periodically receives data from Automobile 835 (FIG. 170) (S1). If the data received is a response signal (S2), Host H locates the geographic location of Automobile 835 by utilizing the method described in FIG. 20*a* and FIG. 20*b* (S3), and sends the location data and the relevant 3D map data of the area where Automobile 835 is located to Communication Device 200 (S4).

As illustrated in FIG. 178, Communication Device 200 periodically receives data from Host H (not shown) (S1). If the data received is the location data and the relevant 3D map data mentioned above, Communication Device 200 displays the 3D map based on the relevant 3D map data and indicates the current location of Automobile 835 (FIG. 170) thereon based on the location data received (S3).

Communication Device 200 can continuously track down the current location of Automobile 835 (FIG. 170) as illustrated in FIG. 179. First, Communication Device 200 sends a request data to Host H (not shown) (S1). As soon as Host H receives the request data (S2), it sends a search signal in the manner illustrated in FIG. 175 (S3). As soon as Automobile 835 receives the search signal (S4), it sends a response signal to Host H (S5). Based on the response signal, Host H locates Automobile 835 with the method described in FIGS. 20*a* and 20*b* (S6). Then Host H sends to Communication Device 200 a renewed location data and a relevant 3D map data of the area where Automobile 835 is currently located (S7). As soon as these data are received (S8), Communication Device 200 displays the 3D map based on the relevant 3D map data and indicates the updated location based on the renewed location data (S9). If Automobile 835 is still within the specified area, Communication Device 200 may utilize the original relevant 3D map data. As another embodiment of the present invention, S1 through S4 may be omitted and make Automobile 835 send a response signal continuously to Host H until Host H sends a command signal to Automobile 835 to cease sending the response signal.

<<Positioning System—Honk/Light Generating System>>

FIGS. 180 through 182 illustrate the honk/light generating system by utilizing Communication Device 200. Here, Automobile 835 in which honk/light generating system is installed is capable to honk and/or emit light by operation of Communication Device 200.

FIG. 180 illustrates Automobile 835 in which honk/light generating system is installed. As described in FIG. 180, Automobile 835 includes Automobile CPU 835*e*, Automobile Wireless Communicator 835*d*, Automobile RAM 835*f*, and Honk/Light Generator 835*g*. Here, Automobile CPU 835*e* implements the honk/light generating system by running the software program stored in Automobile RAM 835*f*. Automobile Wireless Communicator 835*d* is capable of sending and receiving wireless signal in order to communicate with Communication Device 200 in a wireless fashion. Automobile RAM 835*f* stores the software program necessary to implement the honk/light generating system. Honk/Light Generator 835*g* is capable to honk and/or emit light under the control of Automobile CPU 835*e*.

As illustrated in FIG. 181, Automobile RAM 835*f* (FIG. 180) stores Honk/Light Generating Software Storage Area 835*c* of which the details are explained hereinafter.

FIG. 181*a* illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the honk/light generating mode is activated (S3*c*) when the honk/light generating mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 181*b* illustrates the data stored in RAM 206 (FIG. 1). As described in FIG. 181*b*, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the honk/light generating mode is stored in Automobile Find Data Storage Area 2065*b*.

FIG. 181*c* illustrates the method to store the wireless data to the relevant storage area in RAM 206 (FIG. 1). A wireless signal is received via Antenna 218 (FIG. 1) (S1). The received wireless signal is decompressed and converted into a CPU readable format by Signal Processor 208 (FIG. 1), and CPU 211 (FIG. 1) reads the header or the title of the data to identify its data-type in order to determine the location at which the data is stored (S2). According to the identified data-type, communication data is stored in Communication Storage Area 2061*a* (S3*a*), game DL data and game play data area stored in Game DL/Play Data Storage Area 2061*b*/2061*c* (S3*b*), and honk/light generating data is stored in Honk/Light Generating Data Storage Area 2065*b* (S3*c*). The sequence of S1 through S3 is repeated endlessly in order to enable to receive and store multiple types of data simultaneously. For example, the first portion of honk/light generating data is processed as described in S3*c* while the first portion of communication data is processed as described in S3*a*, and the second portion of honk/light generating data is processed as described in S3*c* while the first portion of game DL data is processed as described in S3*b*. The wireless signal received via Antenna 218 may be in TDMA format, FDMA format, and/or CDMA format.

FIGS. 181*d* and 181*e* illustrate the method to identify the current position of Automobile 835 (FIG. 180) by Communication Device 200, which is located somewhere in the matrix of relays illustrated in FIG. 20*b*. Here, the matrix of relays illustrated in FIG. 20*b* is equivalent to GPS artificial satellite. Assuming that Communication Device 200 seeks to honk and/or emit light of Automobile 835.

As described in FIG. 181*d*, first of all an automobile ID of Automobile 835 (FIG. 180) is entered by utilizing Input Device 210 (FIG. 1) or via voice recognition system (S1). As another embodiment, a list of automobile IDs may be listed on LCD 201 (FIG. 1), and the user of Communication Device 200 may select one by utilizing Input Device 210 or via voice recognition system instead. The automobile ID may be Automobile 835's corresponding phone number or the license number assigned thereto. A request data including the automobile ID is sent to Host H (not shown) from Communication Device 200 (S2).

As illustrated in FIG. 181*e*, Host H (not shown) periodically receives data from Communication Device 200 (S1). If the received data is a request data (S2), Host H first of all searches its communication log which records the location of Automobile 835 (FIG. 180) when it last communicated with Host H (S3). Then Host H sends a honk/light generating signal from the relays described in FIG. 20*b* which are located within 100 meter radius from the location registered in the communication log. If there is no response from Automobile 835 (S5), Host H sends the honk/light generating signal from all relays (from R1 to R20 in FIG. 20*b*) to search for Automobile 835 (FIG. 180) (S6).

FIG. 182 illustrates the software program stored in Honk/Light Generating Software Storage Area 835*c* of Automobile RAM 835*b* (FIG. 181). As illustrated in FIG. 182, Automobile CPU 835*e* (FIG. 180) periodically checks the status of the incoming wireless signals (S1). If a honk/light generating signal is detected (S2), Automobile CPU 835*e* sends a response signal to Host H (not shown) via Antenna 218 (FIG. 1) and a signal to Honk/Light Generator 835*g* (FIG. 180) of Automobile 835 (S3).

<<Mobile Ignition Key Function>>

FIGS. 183 through 201 illustrate the mobile ignition key function, i.e., a function to ignite an engine of Automobile 835 with Communication Device 200.

FIG. 183 illustrates the structure of Automobile 835 to implement the mobile ignition key function. Automobile 835 includes Automobile CPU 835*e*, Automobile Wireless Communicator 835*d*, Automobile RAM 835*f*, and Automobile Engine 835*i*. Automobile CPU 835*e* implements the mobile ignition key system by running the software program stored in Automobile RAM 835*f*, Automobile Wireless Communicator 835*d* is capable of sending and receiving wireless signal in order to communicate with Communication Device 200 in a wireless fashion, Automobile RAM 835*f* stores the software program necessary to implement the mobile ignition key system which is explained in details hereinafter, and Automobile Engine 835*i* is an engine which is ignited under the control of Automobile CPU 835*e*.

FIG. 184 illustrates the data stored in Automobile RAM 835*f* (FIG. 183). Automobile RAM 835*f* includes Ignition Key Code Authentication Software Storage Area 835*j* and Ignition Key Code Storage Area 835*k*. Ignition Key Code Authentication Software Storage Area 835*j* stores ignition key code authentication software program which is explained in FIG. 185, and Ignition Key Code Storage Area 835*k* stores an ignition key code which is composed of alphanumeric data.

FIG. 185 illustrates the software program stored in Ignition Key Code Authentication Software Storage Area 835*j* (FIG. 184). As described in FIG. 185, Automobile CPU 835*e* (FIG. 183) periodically checks the incoming wireless signal received by Automobile Wireless Communicator 835*d* (FIG. 183) (S1). If the incoming wireless signal includes an ignition key code (S2), Automobile CPU 835*e* retrieves the ignition key code stored in Ignition Key Code Storage Area 835*k* and compares both data (S3). If the received ignition key code matches the ignition key code stored in Ignition Key Code Storage Area 835*k* (S4), Automobile CPU 835*e* instructs Automobile Engine 835*i* to ignite (S5).

FIG. 186 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the ignition key mode is activated (S3*c*) when the ignition key mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 187 illustrates the data stored in RAM 206 (FIG. 1). As described in FIG. 187, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the ignition key mode is stored in Ignition Key Data Storage Area 2066*a*.

FIG. 188 illustrates the data stored in Ignition Key Data Storage Area 2066*a* (FIG. 187). Ignition key Data Storage Area 2066*a* includes Ignition Key Code Transmitting Software Storage Area 2066*b* and Ignition Key Code Storage Area 2066*c*. Ignition Key Code Transmitting Software Storage Area 2066*b* stores a software program to transmit the ignition key code to Automobile 835 (FIG. 183), which is explained in FIG. 188*a*. Ignition Key Code Storage Area 2066*c* stores an ignition key code which is transmitted to Automobile 835 to ignite Automobile Engine 835*i* (FIG. 183). Ignition Key Code Storage Area 2066*c* also stores user ID and password of the user of Communication Device 200.

FIG. 188*a* illustrates the software program stored in Ignition Key Code Transmitting Software Storage Area 2066*b* (FIG. 188). Firsts of all, the user of Communication Device 200 inputs an user ID and password (S1). CPU 211 (FIG. 1) retrieves the user ID and password from Ignition Key Code Storage Area 2066*c* (FIG. 188) and compares with the input user ID and password. If both sets of data match (S2), CPU 211 displays the ignition key code on LCD 201 (FIG. 1) stored in Ignition Key Code Storage Area 2066*c* (S3). When a certain signal is input from Input Device 210 (FIG. 1) to grant transmitting the ignition key code (S4), CPU 211 transmits the ignition key code via Antenna 218 (FIG. 1) in a wireless fashion (S5).

FIG. 189 illustrates the method to transmit the ignition key code from Communication Device 200 to Automobile 835 (FIG. 183). As described in FIG. 189, the ignition key code is transmitted from Communication Device 200 to Automobile 835 via Network NT, such as the Internet. The transmissions between Communication Device 200—Network NT and Network NT—Automobile 835 are rendered in a wireless fashion.

FIG. 190 illustrates another method to transmit the ignition key code from Communication Device 200 to Automobile 835 (FIG. 183). In this embodiment, the ignition key code is transmitted directly to Automobile 835 from Communication Device 200. The bluetooth may be utilized to implement this method of transmission.

FIGS. 191 through 193 illustrate the method for Host H to ignite Automobile Engine 835*i* (FIG. 183).

FIG. 191 illustrates the connection between Host H and Automobile 835. As described in FIG. 191, Host H and Automobile 835 are connected via Network NT, such as the Internet. The transmissions between Host H—Network NT and Network NT—Automobile 835 are rendered in a wireless fashion.

FIG. 192 illustrates the data stored in Host H. As described in FIG. 192, Host H includes Customers' Ignition Key Code Transmitting Software Storage Area Hg and Customers' Ignition Key Code Storage Area Hh. The software program stored in Customers' Ignition Key Code Transmitting Software Storage Area Hg, in the first step, selects the ignition key code and then, in the second step, transmits the selected ignition key code to Automobile 835 by the method explained in FIG. 191. The selection of ignition key code may be manually performed by an operator (i.e., human being) by the request of the user of Communication Device 200 (i.e., the owner of Automobile 835). The data stored in Customers' Ignition Key Code Storage Area Hh is explained in FIG. 193.

FIG. 193 illustrates the data stored in Customers' Ignition Key Code Storage Area Hh (FIG. 192). As described in FIG. 193, a plurality of ignition key codes are stored in Customers' Ignition Key Code Storage Area Hh. In the present example, Ignition Key Code IKC1 corresponding to Automobile AM1, Ignition Key Code IKC2 corresponding to Automobile AM2, Ignition Key Code IKC3 corresponding to Automobile AM3, Ignition Key Code IKC4 corresponding to Automobile AM4, Ignition Key Code IKC5 corresponding to Automobile AM5, Ignition Key Code IKC6 corresponding to Automobile AM6, Ignition Key Code IKC7 corresponding to Automobile AM7, Ignition Key Code IKC8 corresponding to Automobile AM8, and Ignition Key Code IKC9 corresponding to Automobile AM9 are stored in Customers' Ignition Key Code Storage Area Hh.

FIG. 194 illustrates a software program, which is stored in Ignition Key Data Storage Area 2066*a* (FIG. 188, however, specific storage area not shown), to change the ignition key code stored in Customers' Ignition Key Code Storage Area Hh (FIG. 193) of Host H (FIG. 191) by the user of Communication Device 200. Firsts of all, the user of Communication Device 200 inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 188) and compares with the input user ID and password. If both sets of data match (S2), CPU 211 displays a list of the ignition key code stored in Ignition Key Code Storage Area 2066*c* assuming that more than one ignition key code is stored therein (S3). After selecting a certain ignition key code by utilizing Input Device 210 or via voice recognition system (S4) and confirmation process (S5) by the user of Communication Device 200 are completed, the user inputs a new ignition key code and retypes the new ignition key code for confirmation (S6). If CPU 211 determines that both ignition key codes are exactly the same (S7), it transmits a change signal including the new ignition key code to Host H in a wireless fashion via Antenna 218 (FIG. 1) (S8).

FIG. 195 illustrates a software program, which is stored in Host H (FIG. 192, however, specific storage area not shown) to change the ignition key code stored in Customers' Ignition Key Code Storage Area Hh (FIG. 192). First of all, Host H periodically checks the incoming wireless signal received (S1). If the received incoming signal is a change signal transmitted from Communication Device 200 (S2), Host H retrieves the user ID and password stored in a specific area of Customers' Ignition Key Code Storage Area Hh (FIG. 192, however, specific storage area not shown) and compares with the user ID and password included in the received change signal. If Host H determines that both data are exactly the same (S3), it changes the ignition key code stored in Customers' Ignition Key Code Storage Area Hh to a new one (S4).

FIG. 196 illustrates another structure of Automobile 835 to implement the mobile ignition key function. Automobile 835 includes Automobile CPU 835*e*, Automobile Wireless Communicator 835*d*, Automobile RAM 835*f*, and Automobile Engine 835*i*. Automobile CPU 835*e* implements the mobile ignition key system by running the software program stored in Automobile RAM 835*f*, Automobile Wireless Communicator 835*d* is capable of sending and receiving wireless signal in order to communicate with Communication Device 200 in a wireless fashion, Automobile RAM 835*f* stores the software program necessary to implement the mobile ignition key system, and Automobile Engine 835*i* is an engine which is ignited under the control of Automobile CPU 835*e*. The new element added to this embodiment compared to the one described in FIG. 183 is Conventional Ignition Key Controller 8351. Conventional Ignition Key Controller 8351 is a device to ignite Automobile Engine 835*i* by way of inserting a tangible ignition key therein. The user of Communication Device 200 is allowed to ignite Automobile Engine 835*i* by utilizing a tangible ignition key in a conventional manner instead of transmitting an ignition key code from Communication Device 200 in this embodiment.

FIG. 197 illustrates another example of the data stored in Ignition Key Code Storage Area 2066*c* (FIG. 188). Ignition Key Code Storage Area 2066*c* is capable of storing a plurality of ignition key codes in this embodiment. In the present example, Ignition Key Code IKCa corresponding to Automobile AMa, Ignition Key Code IKCb corresponding to Automobile AMb, and Ignition Key Code IKCc corresponding to Automobile AMc are stored in Ignition Key Code Storage Area 2066*c*.

FIG. 198 illustrates the software program stored in Ignition Key Code Transmitting Software Storage Area 2066*b* (FIG. 188). The software program illustrated in FIG. 198 is similar to the one illustrated in FIG. 188*a* except that the present embodiment allows the user of Communication Device 200 to select one ignition key code from a list of ignition key codes to be transmitted to Automobile 835 (FIG. 183). As described in FIG. 198, the user of Communication Device 200, first of all, inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 188) and compares with the input user ID and password. If both sets of data match (S2), CPU 211 displays a list of ignition key code on LCD 201 (FIG. 1) stored in Ignition Key Code Storage Area 2066*c* (S3). The user of Communication Device 200 selects one of the ignition key codes by utilizing Input Device 210 or by the voice recognition system (S4). When a certain signal is input from Input Device 210 (FIG. 1) or via voice recognition system to grant transmitting the ignition key code (S5), CPU 211 transmits the ignition key code via Antenna 218 (FIG. 1) in a wireless fashion (S6).

FIG. 199 illustrates another example of the data stored in Ignition Key Code Storage Area 2066*c* (FIG. 188). Compared to the one illustrated in FIG. 197, Ignition Key Code Storage Area 2066*c* in this embodiment stores a plurality of ignition key codes for automobiles and motorcycles, and also stores key codes for doors of a house. More precisely, Ignition Key Code IKCa corresponding to Automobile AMa, Ignition Key Code IKCb corresponding to Automobile AMb, Ignition Key Code IKCc corresponding to Automobile AMc, Ignition Key Code IKCd corresponding to Automobile AMd, Ignition Key Code IKCe corresponding to Automobile AMe, Ignition Key Code IKCf corresponding to Motorcycle MCa, Ignition Key Code IKCg corresponding to Motorcycle MCb, Ignition Key Code IKCh corresponding to Motorcycle MCc, Key Code KCa corresponding to Entrance Door ED, Key Code KCb corresponding to Back Door BD, and Key Code KCc corresponding to Side Door SD are stored in Ignition Key Code Storage Area 2066*c*.

FIG. 200 illustrates a software program, which is stored in Ignition Key Data Storage Area 2066*a* (FIG. 188, however, specific storage area not shown), to change the ignition key code stored in Ignition Key Code Storage Area 835*k* (FIG. 184) of Automobile 835 (FIG. 183) by the user of Communication Device 200. Firsts of all, the user of Communication Device 200 inputs user ID and password by utilizing Input Device 210 (FIG. 1) or via voice recognition system (S1). CPU 211 (FIG. 1) retrieves the user ID and password from Ignition Key Code Storage Area 2066*c* (FIG. 188) and compares with the input user ID and password. If both sets of data match (S2), CPU 211 displays a list of the ignition key codes stored in Ignition Key Code Storage Area 2066*c* (S3). After selecting a certain ignition key code by utilizing Input Device 210 or via voice recognition system (S4) and confirmation process (S5) by the user of Communication Device 200 are completed, the user inputs a new ignition key code and retypes the new ignition key code for confirmation (S6). If CPU 211 determines that both ignition key codes are exactly the same (S7), it transmits a change signal including the new ignition key code to Automobile 835 in a wireless fashion via Antenna 218 (FIG. 1) (S8).

FIG. 201 illustrates a software program, which is stored in Automobile RAM 835*f* (FIG. 184, however, specific storage area not shown) to change the ignition key code stored in Ignition Key Code Storage Area 835*k* (FIG. 184). First of all, Automobile CPU 835*e* (FIG. 183) periodically checks the incoming wireless signal received by Automobile Wireless Communicator 835*d* (FIG. 183) (S1). If the received incoming signal is a change signal transmitted from Communication Device 200 (S2), Automobile CPU 835*e* retrieves the user ID and password stored in Automobile RAM 835*f* (FIG. 184, however, specific storage area not shown) and compares with the user ID and password included in the received change signal. If Automobile CPU 835*e* determines that both data are exactly the same (S3), it changes the ignition key code stored in automobile RAM 835*k* to a new one (S4).

<<Voice Print Authentication System>>

FIGS. 202 through 211 illustrate the voice print authentication system of Communication Device 200.

FIG. 202 illustrates the software program installed in Communication Device 200 to initiate the present system. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the authentication mode is activated (S3*c*) when the authentication mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 203 illustrates the data stored in RAM 206 (FIG. 1). As described in FIG. 203, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the authentication mode is stored in Authentication Data Storage Area 2067*f*.

FIG. 204 illustrates the data stored in Authentication Data Storage Area 2067*f* (FIG. 1). As described in FIG. 204, Authentication Data Storage Area 2067*f* includes Input Voice Data Storage Area 2067*a*, Authentication Software Storage Area 2067*b*, and Voice Print Data Storage Area 2067*c*. Input Voice Data Storage Area 2067*a* stores a voice data input from Microphone 215 (FIG. 1), Authentication Software Storage Area 2067*b* stores software program to implement the present function explained hereinafter, and Voice Print Data Storage Area 2067*c* stores Voice Print Data #1 2067*d* and Voice Print Data #2 2067*e*, as described in FIG. 204, both of which are utilized for comparison by the software program stored in Authentication Software Storage Area 2067*b*.

FIG. 205 illustrates the concept of the voice print authentication software program explained in details hereinafter. First of all, CPU 211 (FIG. 1) compares the voice data stored in Input Voice Data Storage Area 2067*a* (FIG. 204) with one or more of the voice print data stored in Voice Print Data Storage Area 2067*c* (FIG. 204) (S1). If both data area exactly the same (S2), the voice print authentication process is successful and CPU 211 thereby unlocks Communication Device 200 (i.e., authorizes to utilize Communication Device 200) (S3).

FIG. 206 illustrates an embodiment of the voice print authentication software program stored in Authentication Software Storage Area 2067*b* (FIG. 204). As described in FIG. 206, user ID is input via Microphone 215 (FIG. 1), which is stored in Input Voice Data Storage Area 2067*a* (FIG. 204) (S1). CPU 211 (FIG. 1) retrieves Voice Print Data #1 2067*d* from Voice Print Data Storage Area 2067*c* (FIG. 204) (S2). If both data are exactly the same (S3), password is then input via Microphone 215 (FIG. 1), which is also stored in Input Voice Data Storage Area 2067*a* (S4). CPU 211 retrieves Voice Print Data #2 2067*e* from Voice Print Data Storage Area 2067*c* (S5). If both data are exactly the same (S6), the voice print authentication process is successful and CPU 211 thereby unlocks Communication Device 200 (i.e., authorizes to utilize Communication Device 200) (S7).

FIG. 207 illustrates another embodiment of the voice print authentication software program stored in Authentication Software Storage Area 2067*b* (FIG. 204). As described in FIG. 207, user ID and password are input consecutively via Microphone 215 (FIG. 1), which are stored in Input Voice Data Storage Area 2067*a* (FIG. 204) (S1). CPU 211 (FIG. 1) retrieves Voice Print Data #1 2067*d* and Voice Print Data #2 2067*e* from Voice Print Data Storage Area 2067*c* (FIG. 204) (S2). If both sets of data are exactly the same (S3), the voice print authentication process is successful and CPU 211 thereby unlocks Communication Device 200 (i.e., authorizes to utilize Communication Device 200) (S4).

FIGS. 208 and 209 illustrate the method to process with the voice data input from Microphone 215 (FIG. 1) in the authentication mode and the communication mode utilizing the voice recognition system. As described in FIG. 208, when Communication Device 200 is in the authentication mode, CPU 211 (FIG. 1) periodically checks voice data from Microphone 215 (FIG. 1) (S1), and if CPU 211 detects a voice data input (S2), it stores the voice data in Input Voice Data Storage Area 2067*a* (FIG. 204) (S3) in order to proceed with the authentication process explained hereinbefore (S4). As described in FIG. 209, when Communication Device 200 is in the communication mode, CPU 211 periodically checks voice data from Microphone 215 (FIG. 1) (S1) and proceeds with the voice data to implement the voice recognition system as explained hereinbefore (S2).

FIGS. 210*a* and 210*b* illustrate the software program to change or renew Voice Print Data #1 2067*d* stored in Voice Print Data Storage Area 2067*c* (FIG. 204). First of all, an authentication code is input via Input Device 210 (FIG. 1) or via Microphone 215 (FIG. 1) by utilizing the voice recognition system (S1). CPU 211 (FIG. 1) then retrieves the authentication code stored in Authentication Data Storage Area 2067*f* (FIG. 204, however specific storage area not shown) and compares both data. If both data are exactly the same (S2), CPU 211 displays a list of voice print data stored in Voice Print Storage Area 2067*c* (FIG. 204), i.e., Voice Print Data #1 2067*d* and Voice Print Data #2 2067*e* (S3), and Voice Print Data #1 2067*d* is selected by Input Device 210 or by the voice recognition system (S4). The old Voice Print Data #1 is input via Microphone 215 and compared with Voice Print Data #1 2067*d* stored in Voice Print Data Storage Area 2067*c* (S5). If both data are exactly the same (S6), a new data is input via Microphone 215, and the same voice data is input again for verification (S7). If both data are exactly the same (S8), the new voice data is stored in Voice Print Data Storage Area 2067*c* as Voice Print Data #1 2067*d* (S9).

FIGS. 211*a* and 211*b* illustrate the software program to change or renew Voice Print Data #2 2067*e* stored in Voice Print Data Storage Area 2067*c* (FIG. 204). First of all, an authentication code is input via Input Device 210 (FIG. 1) or via Microphone 215 (FIG. 1) by utilizing the voice recognition system (S1). CPU 211 (FIG. 1) then retrieves the authentication code stored in Authentication Data Storage Area 2067*f* (FIG. 204, however specific storage area not shown) and compares both data. If both data are exactly the same (S2), CPU 211 displays a list of voice print data stored in Voice Print Storage Area 2067*c* (FIG. 204), i.e., Voice Print Data #1 2067*d* and Voice Print Data #2 2067*e* (S3), and Voice Print Data #2 2067*e* is selected by Input Device 210 or by the voice recognition system (S4). The old Voice Print Data #2 is input via Microphone 215 and compared with Voice Print Data #2 2067*e* stored in Voice Print Data Storage Area 2067*c* (S5). If both data are exactly the same (S6), a new data is input via Microphone 215, and the same voice data is input again for verification (S7). If both data are exactly the same (S8), the new voice data is stored in Voice Print Data Storage Area 2067*c* as Voice Print Data #2 2067*e* (S9).

<<Fingerprint Authentication System>>

FIGS. 212 through 221 illustrate the fingerprint authentication system of Communication Device 200 (FIG. 1).

FIG. 212 illustrates the structure of Communication Device 200 to implement the fingerprint authentication system. As described in FIG. 212, communication system 200 includes Fingerprint Scanner FPS and Eye Print Scanner EPS.

FIG. 213 illustrates the data stored in RAM 206 (FIG. 1). As described in FIG. 213, RAM 206 includes Authentication Software Storage Area 2068*a*, Fingerprint Data Storage Area 2068*b*, and Eye Print Data Storage Area 2068*c*. Authentication Software Storage Area 2068*a* stores an authentication software program to implement the fingerprint authentication system of which the details are explained hereinafter, Fingerprint Data Storage Area 2068*b* stores the data regarding the fingerprints of both hands of the user of Communication Device 200 (i.e., L1, L2, L3, L4, L5, R1, R2, R3, R4, and R5), and Eye Print Data Storage Area 2068*c* stores the data regarding eye prints of both eyes of the user of Communication Device 200 (i.e., E1 and E2). Here, L1 represents the fingerprint data regarding the left thumb, L2 represents the fingerprint data regarding the left first finger, L3 represents the fingerprint data regarding the left second finger, L4 represents the fingerprint data regarding the left third finger, L5 represents the fingerprint data regarding the left little finger, R1 represents the fingerprint data regarding the right thumb, R2 represents the fingerprint data regarding the right first finger, R3 represents the fingerprint data regarding the right second finger, R4 represents the fingerprint data regarding the right third finger, and R5 represents the fingerprint data regarding the right little finger. In addition, E1 represents the eye print data regarding the left eye and E2 represents the eye print data regarding the right eye.

FIG. 214 illustrates the concept of the fingerprint authentication software program which is stored in Authentication Software Storage Area 2068*a* (FIG. 213), and the details of which is explained hereinafter. First of all, CPU 211 (FIG. 1) compares the fingerprint data scanned by Fingerprint Scanner FPS (FIG. 212) with one or more of the fingerprint data stored in Fingerprint Data Storage Area 2068*b* (FIG. 213) (S1). If both data area exactly the same (S2), the fingerprint authentication process is successful and CPU 211 thereby unlocks Communication Device 200 (i.e., authorizes to utilize Communication Device 200) (S3).

FIG. 215 illustrates an embodiment of the fingerprint authentication software program stored in Authentication Software Storage Area 2068*a* (FIG. 213). First of all, the user of Communication Device 200 selects one of his/her fingers at his/her discretion and scan the fingerprint by Fingerprint Scanner FPS (FIG. 212) (S1). CPU 211 (FIG. 1) then retrieves all fingerprint data from Fingerprint Data Storage Area 2068*b* (FIG. 213) and compares with the user's fingerprint data. If both data are exactly the same (S2), the user of Communication Device 200 selects another finger (other than the one scanned in S1) at his/her discretion and scan the fingerprint by Fingerprint Scanner FPS (FIG. 212) (S3). CPU 211 (FIG. 1) then retrieves all fingerprint data from Fingerprint Data Storage Area 2068*b* (FIG. 213) excluding the one already utilized in S2 and compare with the user's fingerprint data. If both data are exactly the same (S4), the fingerprint authentication process is successful and CPU 211 thereby unlocks Communication Device 200 (i.e., authorizes to utilize Communication Device 200) (S5).

FIG. 216 illustrates another embodiment of the fingerprint authentication software program stored in Authentication Software Storage Area 2068*a* (FIG. 213). First of all, CPU 211 (FIG. 1) selects the predetermined fingerprint (e.g., the fingerprint of the right first finger) to be scanned and displays on LCD 201 (FIG. 1) (S1). The user of Communication Device 200 then scans the selected fingerprint (e.g., the fingerprint of the right first finger) by Fingerprint Scanner FPS (FIG. 212) (S2). CPU 211 retrieves the predetermined fingerprint data (e.g., R2) from Fingerprint Data Storage Area 2068*b* (FIG. 213) and compares with the users fingerprint data. If both data are exactly the same (S3), CPU 211 selects another predetermined fingerprint (e.g., the fingerprint of the left first finger) to be next scanned and displays on LCD 201 (S4). The user of Communication Device 200 then scans the selected fingerprint (e.g., the fingerprint of the left first finger) by Fingerprint Scanner FPS (S5). CPU 211 then retrieves the predetermined fingerprint data (e.g., L2) from Fingerprint Data Storage Area 2068*b* and compare with the user's fingerprint data. If both data are exactly the same (S6), the fingerprint authentication process is successful and CPU 211 thereby unlocks Communication Device 200 (i.e., authorizes to utilize Communication Device 200) (S7).

FIG. 217 illustrates another embodiment of the fingerprint authentication software program stored in Authentication Software Storage Area 2068*a* (FIG. 213). First of all, CPU

211 (FIG. 1) randomly selects the fingerprint to be scanned and displays on LCD 201 (FIG. 1) (S1). The user of Communication Device 200 then scans the selected fingerprint by Fingerprint Scanner FPS (FIG. 212) (S2). CPU 211 retrieves the fingerprint data selected in S1 from Fingerprint Data Storage Area 2068*b* (FIG. 213) and compares with the user's fingerprint data. If both data are exactly the same (S3), CPU 211 randomly selects the fingerprint to be next scanned and displays on LCD 201 (S4). The user of Communication Device 200 then scans the selected fingerprint by Fingerprint Scanner FPS (S5). CPU 211 then retrieves the fingerprint data selected in S4 from Fingerprint Data Storage Area 2068*b* and compare with the user's fingerprint data. If both data are exactly the same (S6), the fingerprint authentication process is successful and CPU 211 thereby unlocks Communication Device 200 (i.e., authorizes to utilize Communication Device 200) (S7).

FIG. 218 illustrates another embodiment of the fingerprint authentication software program stored in authentication Software Storage Area 2067*a* (FIG. 213). First of all, the user of Communication Device 200 selects two of his/her fingers at his/her discretion and scan the fingerprints by Fingerprint Scanner FPS (FIG. 212) (S1). CPU 211 (FIG. 1) then retrieves all fingerprint data from Fingerprint Data Storage Area 2068*b* (FIG. 213) and compares with the user's fingerprint data. If both sets of data are exactly the same (S2), the fingerprint authentication process is successful and CPU 211 thereby unlocks Communication Device 200 (i.e., authorizes to utilize Communication Device 200) (S3).

FIG. 219 illustrates another embodiment of the fingerprint authentication software program stored in Authentication Software Storage Area 2068*a* (FIG. 213). First of all, CPU 211 (FIG. 1) selects two predetermined fingerprints (e.g., the right first finger and the left first finger) to be scanned and displays on LCD 201 (FIG. 1) (S1). The user of Communication Device 200 then scans the selected fingerprints (e.g., the right first finger and the left first finger) by Fingerprint Scanner FPS (FIG. 212) (S2). CPU 211 retrieves two predetermined fingerprint data (e.g., R2 and L2) from Fingerprint Data Storage Area 2068*b* (FIG. 213) and compares with the user's fingerprint data. If both sets of data are exactly the same (S3), the fingerprint authentication process is successful and CPU 211 thereby unlocks Communication Device 200 (i.e., authorizes to utilize Communication Device 200) (S7).

FIG. 220 illustrates another embodiment of the fingerprint authentication software program stored in Authentication Software Storage Area 2068*a* (FIG. 213). First of all, CPU 211 (FIG. 1) randomly selects two fingerprints to be scanned and displays on LCD 201 (FIG. 1) (S1). The user of Communication Device 200 then scans the selected fingerprints by Fingerprint Scanner FPS (FIG. 212) (S2). CPU 211 retrieves fingerprint data selected in S1 from Fingerprint Data Storage Area 2068*b* (FIG. 213) and compares with the user's fingerprint data. If both sets of data are exactly the same (S3), the fingerprint authentication process is successful and CPU 211 thereby unlocks Communication Device 200 (i.e., authorizes to utilize Communication Device 200) (S7).

FIG. 221 illustrates another embodiment of the fingerprint authentication software program stored in Authentication Software Storage Area 2068*a* (FIG. 213). First of all, the user of Communication Device 200 selects one of his/her fingers at his/her discretion and scan the fingerprint by Fingerprint Scanner FPS (FIG. 212) (S1). CPU 211 (FIG. 1) then retrieves all fingerprint data from Fingerprint Data Storage Area 2068*b* (FIG. 213) and compares with the user's fingerprint data. If both data are exactly the same (S2), the fingerprint authentication process is successful and CPU 211 thereby unlocks Communication Device 200 (i.e., authorizes to utilize Communication Device 200) (S3).

As another embodiment, Fingerprint Scanner FPS explained in FIG. 212 can be composed of two scanners FPS1 and FPS2 (both of which not shown in FIG. 212) in order to scan two fingerprints simultaneously.

<<Auto Time Adjust Function>>

FIGS. 222 to 224 illustrate the automatic time adjust function, i.e., a function which automatically adjusts the clock of Communication Device 200.

FIG. 222 illustrates the data stored in RAM 206 (FIG. 1). As described in FIG. 222, RAM 206 includes Auto Time Adjust Software Storage Area 2069*a*, Current Time Data Storage Area 2069*b*, and Auto Time Data Storage Area 2069*c*. Auto Time Adjust Software Storage Area 2069*a* stores software program to implement the present function which is explained in details hereinafter, Current Time Data Storage Area 2069*b* stores the data which represents the current time, and Auto Time Data Storage Area 2069*c* is a working area assigned for implementing the present function.

FIG. 223 illustrates a software program stored in Auto Time Adjust Software Storage Area 2069*a* (FIG. 222). First of all, Communication Device 200 is connected to Network NT (e.g., the Internet) via Antenna 218 (FIG. 1) (S1). CPU 211 (FIG. 1) then retrieves an atomic clock data from Network NT (S2) and the current time data from Current Time Data Storage Area 2069*b* (FIG. 222), and compares both data. If the difference between both data is not within the predetermined value X (S3), CPU 211 adjusts the current time data (S4). The method to adjust the current data can be either simply overwrite the data stored in Current Time Data Storage Area 2069*b* with the atomic clock data retrieved from Network NT or calculate the difference of the two data and add or subtract the difference to or from the current time data stored in Current Time Data Storage Area 2069*b* by utilizing Auto Time Data Storage Area 2069*c* (FIG. 222) as a working area.

FIG. 224 illustrates another software program stored in Auto Time Adjust Software Storage Area 2069*a* (FIG. 222). When the power of Communication Device 200 is turned on (S1), CPU 211 (FIG. 1) stores a predetermined timer value in Auto Time Data Storage Area 2069*c* (FIG. 222) (S2). The timer value is decremented periodically (S3). When the timer value equals to zero (S4), the automatic timer adjust function is activated (S5) and CPU 211 performs the sequence described in FIG. 223, and the sequence of S2 through S4 is repeated thereafter.

<<Video/Photo Mode>>

FIG. 225 illustrates the details of CCD Unit 214 (FIG. 1). As described in FIG. 225, CCD Unit 214 is mounted on Rotator 291 (FIG. 44*c*) which is rotatably connected to the side of Communication Device 200 as described in FIG. 44*c*. Indicator 212 (FIG. 1) is attached to the surface of CCD Unit 214.

FIG. 226 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the video/photo mode is activated (S3*c*) when the video/photo mode is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 227 illustrates the data stored in RAM 206 (FIG. 1). As described in FIG. 227, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the video/photo mode is stored in Video/Photo Data Storage Area 20610*a*.

FIG. 228 illustrates the software programs and data stored in Video/Photo Data Storage Area 20610*a* (FIG. 227). As described in FIG. 228, Video/Photo Data Storage Area 20610*a* includes Video/Photo Software Storage Area 20610*b*, Video Data Storage Area 20610*c*, Audio Data Storage Area 20610*d*, Photo Data Storage Area 20610*e*, Photo Sound Data Storage Area 20610*f*, and Indicator Data Storage Area 20610*g*. Video/Photo Software Storage Area 20610*b* stores the software programs described in FIGS. 231 through 233*a*, 233*d*, 233*e*, 236 through 238, 240, and 242. Video Data Storage Area 20610*c* stores the data described in FIG. 228*a*. Audio Data Storage Area 20610*d* stores the data described in FIG. 228*b*. Photo Data Storage Area 20610*e* stores the data described in FIG. 228*c*. Photo Sound Data Storage Area 20610*f* stores a sound data (preferably a wave data) producing a sound similar to the one when a conventional camera is activated. Indicator Data Storage Area 20610*g* stores the data described in FIG. 229. Video Data Storage Area 20610*c* and Audio Data Storage Area 20610*d* primarily stores the similar data stored in Area 267 and Area 268 of FIG. 39, respectively.

FIG. 228*a* illustrates the data stored in Video Data Storage Area 20610*c* (FIG. 228). Video Data Storage Area 20610*c* stores a plurality of video data which goes through the process described in FIG. 232*a* hereinafter. In the present example, six video data, i.e., Video #1, Video #2, Video #3, Video #4, Video #5, and Video #6, are currently stored in Video Data Storage Area 20610*c*. Message Data Storage Area (MS2*a*, MS3*a*) 20610*h* is also included in Video Data Storage Area 20610*c*, which stores the text data of MS2*a* ('REC') and MS3*a* ('STOP') shown in FIG. 235 hereinafter.

FIG. 228*b* illustrates the data stored in Audio Data Storage Area 20610*d* (FIG. 228). Audio Data Storage Area 20610*d* stores a plurality of audio data which goes through the process described in FIG. 232*a* hereinafter. In the present example, six audio data, i.e., Audio #1, Audio #2, Audio #3, Audio #4, Audio #5, and Audio #6 are currently stored in Audio Data Storage Area 20610*d*. Each audio data stored in Audio Data Storage Area 20610*d* corresponds to the video data stored in Video Data Storage Area 20610*c* (FIG. 228*a*). Namely, Video #1 corresponds to Audio #1, Video #2 corresponds to Audio #2, Video #3 corresponds to Audio #3, Video #4 corresponds to Audio #4, Video #5 corresponds to Audio #5, and Video #6 corresponds to Audio #6.

FIG. 228*c* illustrates the data stored in Photo Data Storage Area 20610*e* (FIG. 228). Photo Data Storage Area 20610*e* stores a plurality of photo data which goes through the process described in FIG. 240 hereinafter. In the present example, six photo data, i.e., Photo #1, Photo #2, Photo #3, Photo #4, Photo #5, and Photo #6 are currently stored in Photo Data Storage Area 20610*e*. Message Data Storage Area (MS4*a*) 20610*i* is also included in Photo Data Storage Area 20610*e*, which stores the text data of MS4*a* ('SHOT') shown in FIG. 239 hereinafter.

FIG. 229 illustrates the data stored in Indicator Data Storage Area 20610*g* (FIG. 228). Indicator Data Storage Area 20610*g* stores the data regarding the color of Indicator 212 (FIGS. 1 and 225) when Communication Device 200 is in a video mode or a photo mode. According to the data described in FIG. 229, Indicator 212 emits red light when Communication Device 200 is in the video mode and green light when Communication Device 200 is in the photo mode.

FIG. 230 illustrates another example of the data stored in Indicator Data Storage Area 20610*g* (FIG. 228). According to the data described in FIG. 230, Indicator 212 emits a predetermined color, however, with a different pattern. Namely, the light emitted from Indicator 212 turns on and off when Communication Device 200 is in the video mode, whereas the light remains on when Communication Device 200 is in the photo mode.

FIG. 231 illustrates the software program stored in Video/Photo Software Storage Area 20610*b* (FIG. 228). As described in FIG. 231, CPU 211 (FIG. 1) displays a list of the selectable modes, i.e., the video mode and the photo mode (S1). One of the modes is selected by utilizing Input Device 210 (FIG. 1) or via voice recognition system (S2).

FIG. 232 illustrates the software program stored in Video/Photo Software Storage Area 20610*b* (FIG. 228). When the video mode is selected in S2 in FIG. 231, the video mode is initiated and CPU 211 (FIG. 1) is ready to capture and store the video data in one of the areas of Video Data Storage Area 20610*c* (FIG. 228*a*) (S1). Next, the video process is initiated which is described in details in FIG. 232*a* (S2*a*) until a specific signal is input by utilizing Input Device 210 (FIG. 1) or via voice recognition system (S3). The indicator process is activated simultaneously which is described in details in FIG. 233 hereinafter (S2*b*).

FIG. 232*a* illustrates the video process of Communication Device 200, i.e., S2*a* of FIG. 232. As described in FIG. 232*a*, the video data input from CCD Unit 214 (FIGS. 1 and 225) (S1*a*) is converted from analog data to digital data (S2*a*) and is processed by Video Processor 202 (FIG. 1) (S3*a*). The processed video data is stored in Video Data Storage Area 20610*c* (FIG. 228*a*) (S4*a*) and is displayed on LCD 201 (FIG. 1) (S5*a*). As described in the same drawing, the audio data input from Microphone 215 (FIG. 1) (S1*b*) is converted from analog data to digital data by A/D 213 (FIG. 1) (S2*b*) and is processed by Sound Processor 205 (FIG. 1) (S3*b*). The processed audio data is stored in Audio Data Storage Area 20610*d* (FIG. 228*b*) (S4*b*) and is transferred to Sound Processor 205 and is output from Speaker 216 (FIG. 1) via D/A 204 (FIG. 1) (S5*b*). The sequences of S1*a* through S5*a* and S1*b* through S5*b* are continued until a specific signal indicating to stop such sequence is input from Input Device 210 (FIG. 1) or by the voice recognition system (S6).

FIG. 233 illustrates the indicator process of Communication Device 200, i.e., S2*b* of FIG. 232. As described in FIG. 233, CPU 211 (FIG. 1) scans the video mode section of Indicator Data Storage Area 20610*g* (FIG. 229) and retrieves the indicator data therefrom (S1) and activates Indicator 212 (FIGS. 1 and 225) in accordance with the indicator data (S2). In the embodiment explained in FIG. 229, Indicator 212 emits red light while Communication Device 200 is in the video mode and Indicator 212 turns on and off in the embodiment explained in FIG. 230. The sequences of S1 and S2 is continued until a specific signal indicating to stop such sequence is input from Input Device 210 (FIG. 1) or by the voice recognition system (S3).

FIG. 233*a* illustrates the sequence to transfer the video data and the audio data via Antenna 218 (FIG. 1) in a wireless fashion. As described in FIG. 233*a*, CPU 211 (FIG. 1) initiates a dialing process (S1) until the line is connected to a host (not shown) (S2). As soon as the line is connected, CPU 211 reads the video data and the audio data stored in Video Data Storage Area 20610*c* (FIG. 228*a*) and Audio Data Storage Area 20610*d* (FIG. 228*b*) (S3) and transfers these data to Signal Processor 208 (FIG. 1) where these data are converted into a transferring data (S4). The transferring data is transferred from Antenna 218 (FIG. 1) in a wireless fashion (S5). The sequence of S1 through S5 is continued until a specific signal indicating to stop such sequence is input from Input Device 210 (FIG. 1) or via the voice recognition system (S6). The line is disconnected thereafter (S7).

FIG. 233*b* illustrates the basic structure of the transferred data which is transferred from Communication Device 200 as described in S4 and S5 of FIG. 233*a*. Transferred Data 610*a* is primarily composed of Header 611*a*, Video Data 612*a*, Audio Data 613*a*, Relevant Data 614*a*, and Footer 615*a*. Video data 612*a* corresponds to the video data stored in Video Data Storage Area 20610*c* (FIG. 228*a*), and Audio Data 613*a* corresponds to the audio data stored in Audio Data Storage Area 20610*d* (FIG. 228*b*). Relevant Data 614*a* includes various types of data, such as the identification numbers of Device A (i.e., the transferor device) and Device B (i.e., the transferee device), a location data which represents the location of Device A, an email data transferred from Device A to Device B, etc. Header 611*a* and Footer 615*a* represent the beginning and the end of Transferred Data 610*a* respectively.

FIG. 233*c* illustrates the data contained in RAM 206 (FIG. 1) of Device B (i.e., the transferee device). As illustrated in FIG. 233*c*, RAM 206 includes Area 269*a* which stores video data, Area 270*a* which stores audio data, and Area 266*a* which is a work area utilized for the process explained hereinafter.

FIGS. 233*d* and 233*e* illustrates the software program stored in Device B. As described in FIGS. 233*d* and 233*e*, CPU 211 (FIG. 1) of Device B initiates a dialing process (S1) until Device B is connected to a host (not shown) (S2). Transferred Data 610*a* is received by Antenna 218 (FIG. 1) of Device B (S3) and is converted by Signal Processor 208 (FIG. 1) into data readable by CPU 211 (S4). Video data and audio data are retrieved from Transferred Data 610*a* and stored into Area 269*a* (FIG. 233*c*) and Area 270*a* (FIG. 233*c*) of RAM 206 respectively (S5). The video data stored in Area 269*a* is processed by Video Processor 202 (FIG. 1) (S6*a*). The processed video data is converted into an analog data (S7*a*) and displayed on LCD 201 (FIG. 1) (S8*a*). S7*a* may not be necessary depending on the type of LCD 201 used. The audio data stored in Area 270*a* is processed by Sound Processor 205 (FIG. 1) (S6*b*). The processed audio data is converted into analog data by D/A 204 (FIG. 1) (S7*b*) and output from Speaker 216 (FIG. 1) (S8*b*). The sequences of S6*a* through S8*a* and S6*b* through S8*b* are continued until a specific signal indicating to stop such sequence is input by utilizing Input Device 210 (FIG. 1) or via the voice recognition system (S9).

As described in FIG. 234, Message MS1*a* is shown at the upper right corner of LCD 201 (FIG. 1) indicating that a new email has arrived while video/photo mode is implemented.

FIG. 234*a* illustrates the data stored in Email Data Calculating Area 206*c* (FIG. 99) and Email Data Storage Area 206*d* (FIG. 99) in order to implement the incoming message function. Email Data Calculating Area 206*c* includes Incoming Message Calculating Area 206*k* which stores a software program described in FIG. 234*b* hereinafter, and Email Data Storage Area 206*d* includes Message Data Storage Area (MS1*a*) 206*ma* which stores the text data of MS1*a* (in the present example, the text data 'Email' as shown in FIG. 234).

FIG. 234*b* illustrates the software program stored in Incoming Message Calculating Area 206*k* (FIG. 234*a*). First of all, CPU 211 (FIG. 1) checks whether a new incoming message has arrived by scanning Email Data Storage Area 206*d* (FIG. 234*a*) (S1). If a new message has arrived (S2), CPU 211 retrieves the text data (MS1*a*) from Message Data Storage Area (MS1*a*) 206*ma* and displays on LCD 201 (FIG. 1) as described in FIG. 234 for a specified period of time (S3). The software program is executed periodically with a fixed interval.

As described in FIG. 235, Message MS2*a* is shown on LCD 201 (FIG. 1) when the video recording function is implemented, and Message MS3*a* is shown when the implementation of the video recording function has been terminated.

FIG. 236 illustrates the software program stored in Video/Photo Software Storage Area 20610*b* (FIG. 228) to display messages MS2*a* and MS3*a* on LCD 201 (FIG. 1) described in FIG. 235. When a start recording signal has been input by utilizing Input Device 210 (FIG. 1) or via voice recognition system, CPU 211 (FIG. 1) initiates the recording process, i.e., the process described in FIG. 232*a* hereinbefore (S1). During the recording process, the text data of Message MS2*a* is retrieved from Message Data Storage Area (MS2*a*, MS3*a*) 20610*h* (FIG. 228*a*) and displayed at the upper right corner of LCD 201 (FIG. 1) as described in FIG. 235 indicating that the video recording function is in process (S2). If the stop recording signal is input by utilizing Input Device 210 (FIG. 1) or via voice recognition system indicating to stop the video recording process (S3), CPU 211 stops the video recording process (S4), and retrieves the text data of Message MS3*a* from Message Data Storage Area (MS2*a*, MS3*a*) 20610*h* and displays at the upper right corner of LCD 201 as shown in FIG. 235 for a specified period of time (S5). Since Video Data Storage Area 20610*c* and Audio Data Storage Area 20610*d* are divided into several sectors as stated above, a plurality of software program described in FIG. 236 can be activated to record and store a plurality of video data and the corresponding audio data simultaneously.

FIG. 237 illustrates the software program stored in Video/Photo Software Storage Area 20610*b* (FIG. 228) to playback the recorded video data and the corresponding audio data. First, a video data is selected and playback signal is input by utilizing Input Device 210 (FIG. 1) or via voice recognition system (S1). Once these signals are received, CPU 211 (FIG. 1) initiates the playback process of the recorded video data, i.e., CPU 211 retrieves the selected video data from Video Data Storage Area 20610*c* (FIG. 228*a*) and the corresponding audio data from Audio Data Storage Area 20610*d* (FIG. 228*b*), and Video Processor 202 (FIG. 1) processes the channel data to be displayed on LCD 201 (FIG. 1) (S2). This playback process continues until a stop playback signal is input by utilizing Input Device 210 or via voice recognition system (S3). When a stop playback signal is input by utilizing Input Device 210 or via voice recognition system, CPU 211 stops the foregoing process, and retrieves the text data of Message MS3*a* from Message Data Storage Area (MS2*a*, MS3*a*) 20610*h* (FIG. 228*a*) and displays at the upper right corner of LCD 201 as shown in FIG. 235 for a specified period of time (S4).

FIG. 238 illustrates the software program stored in Video/Photo Software Storage Area 20610*b* (FIG. 228). When the photo mode is selected in S2 in FIG. 231, the photo mode is initiated and CPU 211 (FIG. 1) is ready to capture and store the photo data in one of the areas of Photo Data Storage Area 20610*e* (FIG. 228*c*) (S1). Next, the photo process is initiated which is described in details in FIG. 240 (S2*a*) until a specific signal is input by utilizing Input Device 210 (FIG. 1) or via voice recognition system (S3). The indicator process is activated simultaneously which is described in details in FIG. 242 hereinafter (S2*b*).

As described in FIG. 239, Message MS4*a* is shown on LCD 201 (FIG. 1) when a photo is taken with Communication Device 200.

FIG. 240 illustrates the software program stored in Video/Photo Software Storage Area 20610*b* (FIG. 228) to implement the photo mode. When a start recording signal has been input by utilizing Input Device 210 (FIG. 1) or via voice recognition system (S1), CPU 211 (FIG. 1) initiates the recording process, i.e., retrieves an image data input from CCD Unit 214 (FIG. 1), which is currently displayed on LCD 201 (FIG. 1), and stores in one of the sectors of Photo Data Storage Area 20610*e* (FIG. 228*c*), for example Photo #1 described in FIG. 228*c* (S2). CPU 211 retrieves the text data of Message MS4*a* from Message Data Storage Area (MS4*a*) 20610*i* (FIG. 228*c*) and displays at the upper right corner of LCD 201 (FIG. 1) as described in FIG. 239 for a specific period of time indicating that a photo data has been taken and stored (S3). Then CPU 211 retrieves the photo data which is just stored in Photo Data Storage Area 20610*e*, and Video Processor 202 (FIG. 1) processes the photo data to be displayed on LCD 201 (FIG. 1) for a specific period of time (S4). Since Photo Data Storage Area 20610*e* is divided into several sectors as stated above, S1 from S4 can be repeated to record and store a plurality of image data.

FIG. 241 illustrates the software program stored in Video/Photo Software Storage Area 20610*b* (FIG. 228) to display the recorded photo data. First, a photo data is selected by utilizing Input Device 210 (FIG. 1) or via voice recognition system (S1). When this signal is received, CPU 211 (FIG. 1) initiates the display process of the recorded photo data, i.e., CPU 211 retrieves the selected photo data from Photo Data Storage Area 20610*e*, for example Photo #1 described in FIG. 228*c*, and Video Processor 202 (FIG. 1) processes the selected photo data to be displayed on LCD 201 (FIG. 1) (S2). The photo data is displayed until a close signal is input by utilizing Input Device 210 or via voice recognition system (S3). When a close signal is input by utilizing Input Device 210 or via voice recognition system, CPU 211 terminates to display the photo data (S4).

FIG. 242 illustrates the software program stored in Video/Photo Software Storage Area 20610*b* (FIG. 228) which implements the indicator process of Communication Device 200, i.e., S2*b* of FIG. 238. As described in FIG. 242, CPU 211 (FIG. 1) scans the photo mode section of Indicator Data Storage Area 20610*g* (FIG. 229) and retrieves an indicator data therefrom (S1) and activate Indicator 212 (FIGS. 1 and 225) in accordance with the indicator data (S2). In the embodiment explained in FIG. 229, Indicator 212 emits green light while Communication Device 200 is in the photo mode and Indicator 212 remains to be on in the embodiment explained in FIG. 230. The sequence of S1 through S2 is continued until a specific signal indicating to stop such sequence is input from Input Device 210 (FIG. 1) or by the voice recognition system (S3).

<<Call Taxi Function>>

FIGS. 243 through 269 illustrate the call taxi function of Communication Device 200, i.e., the function to call taxi by way of utilizing Communication Device 200.

FIG. 243 illustrates the relationship of each element required to implement the present function. As described in FIG. 243, Communication Device 200 is connected to Host H via Network NT, such as the Internet. Host H is connected to a plurality of Taxi Tx in a wireless fashion.

FIG. 243*a* illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the call taxi function is activated (S3*c*) when the call taxi function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 243*b* illustrates the data stored in RAM 206 (FIG. 1). As described in FIG. 243*b*, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the call taxi function is stored in Call Taxi Information Storage Area 20611*a*.

FIGS. 243*c* and 243*d* illustrate the sequence of display shown on LCD 201 (FIG. 1). First of all, a menu screen is shown on LCD 201 (S1) from which the user of Communication Device 200 activates the call taxi function as described in S2 of FIG. 243*a* by selecting the icon 'Call Taxi Function' displayed on LCD 201 (S2). When the call taxi function is activated, a prompt to identify the pick up location is displayed on LCD 201 (S3*a*). The user of Communication Device 200 may choose the pick up location by selecting one of the two options displayed on LCD 201 as described in S3*a*. The current location of Communication Device 200 is determined as the pick up location if '# Current Location' is selected. If, on the other hand, '# Choose Location' is selected, a 3D map which covers about 3 mile radius from the current position is displayed on LCD 201 from which the pick up location is selected by pinpointing the desired location to be picked up by utilizing Input Device 210 (FIG. 1) or via voice recognition system (S3*b*). Next, the time to pick up is determined by selecting one of the options as described in S4 (FIG. 243*d*). Here, three fixed options are displayed, i.e., '# 5 min later', '# 10 min later', and '# 30 min later'. The pick up time is calculated as the current time plus 5 minutes if the first option is chosen. The pick up time is calculated as the current time plus 10 minutes if the second option is chosen. The pick up time is calculated as the current time plus 30 minutes if the third option is chosen. The pick up time may also be determined by selecting the fourth option ('#______ min later') and input a desired figure into the blank by Input Device 210 or via voice recognition system. The number of the passengers is determined by selecting one of the four fixed options (#1, #2, #3, #4) or by selecting the fifth option and input a desired figure into the blank by input devise 210 or via voice recognitions system (S5). A prompt to determine the destination is displayed on LCD 201 as the last step (S6). The street address to which the user of Communication Device 200 is intending to go is typed into the blank by Input Device 210 or via voice recognition system. Or as another embodiment, a 3D map may be displayed on LCD 201 and the user may pinpoint the location thereon.

FIG. 243e illustrates the software program stored in Host H (FIG. 243). As described in FIG. 243e, Host H includes Host Call Taxi Software Storage Area H11a which stores the software program to be downloaded by Communication Device 200 to implement the call taxi function.

FIG. 244 illustrates the sequence of Communication Device 200 to download the software program stored in Host Call Taxi Software Storage Area H11a (FIG. 243e). As described in FIG. 244, Communication Device 200 connects to Host H (FIG. 243) (S1). Once a connection is established in a wireless fashion via Network NT (FIG. 243), the software program stored in Host Call Taxi Software Storage Area H11a is downloaded to Communication Device 200 (S2). The downloaded software program is then decompressed and stored in the area specified in FIG. 244a hereinafter (S3).

FIG. 244a illustrates the software programs and data stored in Call Taxi Information Storage Area 20611a (FIG. 243b). As described in FIG. 244a, Call Taxi Information Storage Area 20611a includes Call Taxi Software Storage Area 20611b and Call Taxi Data Storage Area 20611c. Here, Call Taxi Software Storage Area 20611b stores a series of software programs downloaded from Host Call Taxi Software Storage Area H11a (FIG. 243e) which are explained in details hereinafter, and Call Taxi Data Storage Area 20611c stores the data required to execute a series of software programs and to implement the call taxi function which are also explained in details hereinafter.

FIG. 245 illustrates one of the software programs stored in Call Taxi Software Storage Area 20611b (FIG. 244a) to activate the call taxi function. As described in S1 of FIG. 243c, a menu screen is shown on LCD 201 under the control of CPU 211 (FIG. 1) from which the user of Communication Device 200 activates the call taxi function as described in S2 of FIG. 243a (S1). Next, CPU 211 activates the call taxi function when the icon 'Call Taxi Function' displayed on LCD 201 described in S2 of FIG. 243c is selected (S2).

FIG. 246 illustrates one of the software programs stored in Call Taxi Software Storage Area 20611b (FIG. 244a) which determines a set of key information in order to call a taxi, i.e., the pick up location, the pick up time, the number of passengers, and the destination. As described in FIG. 246, CPU 211 (FIG. 1), first of all, executes the pick up location determination process (S1). Next, CPU 211 executes the pick up time determination process (S2). Thirdly, CPU 211 executes the passenger number determination process (S3). And fourthly, CPU 211 executes the destination determination process (S4). Each process is explained in details hereinafter. Each and every data produced in each step are stored in Call Taxi Data Storage Area 20611c (FIG. 244a).

FIG. 247 illustrates the software program to execute S1 ('Pick Up Location Determination Process') of FIG. 246. First, CPU 211 (FIG. 1) displays a pick up location prompt (S1) as described in S3a of FIG. 243c. If '# Current Location' is selected in S3a of FIG. 243c (S2), CPU 211 determines that the pick up location is the current geographic location of Communication Device 200 (S4b). The current geographic location of Communication Device 200 is calculated by GPS system explained hereinbefore. If '# Choose Location' is selected in S3a of FIG. 243c (S2), CPU 211 retrieves a 3D map stored in Call Taxi Data Storage Area 20611c (FIG. 244a) which covers about 3 mile radius from the current position and displays on LCD 201 (FIG. 1) (S4a). The 3D map is downloaded from 3D Map Storage Area H11e of Host H (FIG. 243), which is explained in FIG. 254a hereinafter, when the software program stored in Host Call Taxi Software Storage Area H11a (FIG. 243e) is downloaded to Communication Device 200 as explained in FIG. 244 hereinbefore. Once a pick up location is selected by pinpointing the desired location to be picked up by Input Device 210 (FIG. 1) or via voice recognition system (S5), CPU 211 determines as the selected location to be the pick up location (S6).

FIG. 248 illustrates the software program to execute S2 ('Pick Up Time Determination Process') of FIG. 246. First of all, CPU 211 (FIG. 1) displays the four options on LCD 201 (FIG. 1), i.e., '# 5 min later', '# 10 min later', '# 30 min later', and '# ______ min later' as described in S4 of FIG. 243d (S1). Next, one of the four options is selected by Input Device 210 (FIG. 1) or via voice recognition system (S2). Here, CPU 211 determines the pick up time as the value of the current time plus 5 minutes if the first option is selected. CPU 211 determines the pick up time as the value of the current time plus 10 minutes if the second option is selected. CPU 211 determines the pick up time as the value of the current time plus 30 minutes if the third option is selected. CPU 211 determines the pick up time as the value of the current time plus the figure input into the blank by Input Device 210 (FIG. 1) or via voice recognition system if the fourth option is selected.

FIG. 249 illustrates the software program to execute S3 ('Passenger Number Determination Process') of FIG. 246. First, CPU 211 (FIG. 1) displays the five options ('#1', '#2', '#3', '#4', and '# ______') as described in S5 of FIG. 243d. Next, one of the five options is selected by Input Device 210 (FIG. 1) or via voice recognition system (S2). Here, CPU 211 determines that the number of passengers is '1' if the first option is selected. CPU 211 determines that the number of passengers is '2' if the second option is selected. CPU 211 determines that the number of passengers is '3' if the third option is selected. CPU 211 determines that the number of passengers is '4' if the fourth option is selected. CPU 211 determines that the number of passengers is the figure input into the blank if the fifth option is selected.

FIG. 250 illustrates the software program to execute S4 ('Destination Determination Process') of FIG. 246. First, CPU 211 displays a destination prompt with a blank into which the street address of the destination is input (S1). Next, the street address of the destination is input by Input Device 210 (FIG. 1) or via voice recognition system (S2). As another embodiment, a 3D map may be displayed on LCD 201 (FIG. 1) and the user may pinpoint the location thereon by Input Device 210 or via voice recognition system. The method to display a 3D map on LCD 201 is explained hereinbefore. As another embodiment, a list of destinations may be retrieved from RAM 206 (FIG. 1) and be displayed on LCD 201 and one of them may be selected by Input Device 210 or via voice recognition system.

FIG. 251 illustrates one of the software programs stored in Call Taxi Software Storage Area 20611b (FIG. 244a) to send the data produced in FIGS. 246 through 250 to Host H (FIG. 243). First, Communication Device 200 is connected to Host H via Network NT (FIG. 243) in a wireless fashion (S1). CPU 211 (FIG. 1) then formats the data and sends to Host H via Antenna 218 (FIG. 1) as Taxi Inquiry Data TID which is explained in details in FIG. 252 hereinafter.

FIG. 252 illustrates the format of the Taxi Inquiry Data TID described in S2 of FIG. 251. As described in FIG. 252, the Taxi Inquiry Data TID is composed of Header TID1, Caller ID TID2, Pick Up Location Data TID3, Pick Up Time Data TID4, Passenger Number Data TID5, Destination Data TID6, and Footer TID7. Here, Caller ID TID2 is an identification number of Communication Device 200 (e.g., the phone number designated thereto), Pick Up Location Data TID3 is the geographic location data produced by the software program described in FIG. 247, Pick Up Time Data TID4 is the data produced by the software program described in FIG. 248, Passenger Number Data TID5 is the data produced by the software program described in FIG. 249, Destination Data TID6 is the data produced by the software program produced in FIG. 250. Header TID1 and Footer TID7 represent the beginning and end of Taxi Inquiry Data TID respectively.

FIG. 253 illustrates the response of Host H (FIG. 243) when it receives Taxi Inquiry Data TID (FIG. 252). First, Host H periodically checks the incoming wireless signal (S1). If the incoming wireless signal is Taxi Inquiry Data TID (S2), Host H stores the data to Taxi Inquiry Data Storage Area H11*c* explained in FIG. 254*a* hereinafter (S3).

FIG. 254*a* illustrates the data stored in Host H (FIG. 243). As described in FIG. 254*a*, Host H includes Taxi Data Storage Area H11*b*, Taxi Inquiry Data Storage Area H11*c*, Attribution Data Storage Area H11*d*, and 3D Map Storage Area H11*e*. Taxi data Storage Area H11*b* is explained in FIG. 254*b* hereinafter. Taxi Inquiry Data TID detected by the software program described in FIG. 253 is decompressed and stored into Taxi Inquiry Data Storage Area H11*c*. Attribution data Storage Area H11*d* stores a plurality of attribution data, such as data regarding roadblocks, traffic accidents, and road constructions, and traffic jams. The attribution data stored in Attribution Data Storage Area Hid is updated periodically. 3D Map Storage Area H11*e* stores a plurality of 3D maps which represent the sectors administered by Host H.

FIG. 254*b* illustrates the data stored in Taxi Data Storage Area H11*b*. As described in FIG. 254*b*, taxi data storage area H11*b* is categorized in certain fields, i.e., 'Taxi ID', 'Current Location', 'Status', 'Destination', 'Max Passenger #', 'Company', and 'Rate'. The field 'Taxi ID' represents the identification number of each taxi (e.g., license number). The field 'Current Location' represents the current geographical location of each taxi. The field 'Status' represents the current status of each taxi, i.e., whether vacant or occupied. The field 'Destination' represents the geographical location representing the current destination of each taxi. The field 'Max Passenger #' represents the maximum passenger number which can be carried by each taxi at a time. The 'Company' represents the company name to which each taxi belongs. The 'Rate' represents the rate per mile charged by each taxi. Taking for example described in FIG. 254*b*, 'Taxi #1' is currently at the geographical location of 'x1, y1, z1', and the current status is 'Occupied'. Its destination is 'x9, y9, z9' (namely, 'Taxi #1' is currently on its way to destination 'x9, y9, z9') and the maximum passenger number capable to carry at a time is '4'. The company name to which it belongs is 'A Taxi Corp.' and the rate is '$2/mile'. With regard to 'Taxi #2', it is currently at the geographical location of 'x2, y2, z2', and the current status is 'Occupied'. Its destination is 'x10, y10, z10' (namely, 'Taxi #2' is currently on its way to destination 'x10, y10, z10') and the maximum passenger number capable to carry at a time is '4'. The company name to which it belongs is 'A Taxi Corp.' and the rate is '$2/mile'. With regard to 'Taxi #3', it is currently at the geographical location of 'x3, y3, z3', and the current status is 'Vacant'. Its destination is 'Null' since the current status is 'Vacant', and the maximum passenger number capable to carry at a time is '4'. The company name to which it belongs is 'A Taxi Corp.' and the rate is '$2/mile'. With regard to 'Taxi #4', it is currently at the geographical location of 'x4, y4, z4', and the current status is 'Vacant'. Its destination is 'Null' since the current status is 'Vacant', and the maximum passenger number capable to carry at a time is '4'. The company name to which it belongs is 'A Taxi Corp.' and the rate is '$2/mile'. With regard to 'Taxi #5', it is currently at the geographical location of 'x5, y5, z5', and the current status is 'Occupied'. Its destination is 'x11, y11, z11' (namely, 'Taxi #5' is currently on its way to destination 'x11, y11, z11') and the maximum passenger number capable to carry at a time is '8'. The company name to which it belongs is 'B Taxi Corp.' and the rate is '$3/mile'. With regard to 'Taxi #6', it is currently at the geographical location of 'x6, y6, z6', and the current status is 'Occupied'. Its destination is 'x12, y12, z12' (namely, 'Taxi #6' is currently on its way to destination 'x12, y12, z12') and the maximum passenger number capable to carry at a time is '8'. The company name to which it belongs is 'B Taxi Corp.' and the rate is '$3/mile'. With regard to 'Taxi #7', it is currently at the geographical location of 'x7, y7, z7', and the current status is 'Vacant'. Its destination is 'Null' since the current status is 'Vacant', and the maximum passenger number capable to carry at a time is '4'. The company name to which it belongs is 'B Taxi Corp.' and the rate is '$3/mile'. With regard to 'Taxi #8', it is currently at the geographical location of 'x8, y8, z8', and the current status is 'Vacant'. Its destination is 'Null' since the current status is 'Vacant', and the maximum passenger number capable to carry at a time is '4'. The company name to which it belongs is 'B Taxi Corp.' and the rate is '$3/mile'.

FIG. 255 illustrates the software program stored in Host H (FIG. 243) to select the five candidates from the taxi registered in the field 'Taxi ID' of Taxi Data Storage Area H11*b* (FIG. 254). First, Host H retrieves Caller ID TID2, Pick Up Location Data TID3, Pick Up Time Data TID4, Passenger Number Data TID5, and Destination Data TID6 from Taxi Inquiry Data Storage Area H11*c* (FIG. 254) (S1). By referring to the retrieved data, Host H scans Taxi Data Storage Area H11*b* and retrieves a plurality of taxis which match with the conditions stated therein (e.g., the requested passenger number to be carried—Passenger Number Data TID5) (S2), and then selects the five taxis therefrom which most match with the conditions (S3). Next, the estimated waiting time is calculated for the five selected taxis of which the details are explained in the next two drawings (S4). Prices of the five selected taxis are estimated by calculating, in the first place, the distance between the pick up location and the destination, and multiplying with the value stored in the field 'Rate' (S5). The best route from the pick up location to the destination is calculated (S6). Here, Host H takes into consideration the attribution data stored in Attribution Data Storage Area H11*d* (FIG. 254), such as data regarding road blocks, traffic accidents, road constructions, and traffic jams when calculating the best route. Once the sequence from S1 to S6 is completed, Host H forms and sends to Communication Device 200 via Antenna 218 (FIG. 1) in a wireless fashion Estimated Information Data EID, which is explained in FIG. 256 hereinafter (S7).

FIG. 255*a* illustrates the method of calculating the estimated waiting times for the five selected taxis described in S4 of FIG. 255 when the taxi is vacant, i.e., the field 'Status' of Taxi Data Storage Area H11*b* is 'Vacant'. When the taxi is vacant, the estimated waiting time is calculated by referring to the distance from the current location to the pick up location (S1). For example, if 'Taxi #3' is selected as one of the selected five taxis in S3 of FIG. 255, the estimated waiting time is calculated by the method explained in FIG. 255*a*.

FIG. 255*b* illustrates the method of calculating the estimated waiting times for the five selected taxis described in S4 of FIG. 255 when the taxi is occupied, i.e., the field 'Status' of Taxi Data Storage Area H11*b* is 'Occupied'. When the taxi is occupied, first of all, the estimated waiting time of the taxi moving from the current location to the destination is calculated (S1). Next, the estimated waiting time of the taxi moving from the destination to the pick up location is calculated (S2). The two values derived from S1 and S2 are added (S3), and the sum is treated as the estimated waiting time for purposes of the present function. For example, if 'Taxi #1' is selected as one of the selected five taxis in S3 of FIG. 255, the estimated waiting time is calculated by the method explained in FIG. 255*b*.

FIG. 256 illustrates the content of Estimated Information Data EID, i.e., the data sent from Host H (FIG. 243) to Communication Device 200 as explained in S7 of FIG. 255. As described in FIG. 256, Estimated Information Data EID is composed of Header EID1, Caller ID EID2, Host ID EID3, Estimated Waiting Time Data EID4, Estimated Price Data EID5, Estimated Best Route Data EID6, and Footer EID7. Here, Caller ID EID2 is the recipient of Estimated Information Data EID, Host ID EID3 is the sender of Estimated Information Data EID, Estimated Waiting Time Data EID4 is the data calculated in S4 of FIG. 255 for the five selected taxis, Estimated Price Data EID5 is the data calculated in S5 of FIG. 255 for the five selected taxis, Estimated Best Route Data EID6 is the data produced in S6 of FIG. 255. Header EID1 and Footer EID7 represent the beginning and end of Estimated Information Data EID respectively.

FIG. 257 illustrates one of the software programs stored in Call Taxi Software Storage Area 20611*b* (FIG. 244*a*) to display the components of Estimated Information Data EID (FIG. 256). As described in FIG. 257, CPU 211 (FIG. 1) periodically checks the incoming signal (S1). If the incoming signal is Estimated Information Data EID (S2), CPU 211 retrieves data therefrom and displays on LCD 201 (FIG. 1) the estimated waiting times and the estimated prices of the five selected taxis, and the estimated best route data from the pick up location to the destination (S3). One of the five selected taxis is selected (referred as 'Taxi TxS' hereinafter) by Input Device 210 (FIG. 1) or via voice recognition system (S4). The identity of the taxi selected in S4 is sent to Host H (FIG. 243) (S5) as Call Taxi Data CTD, which is explained in FIG. 257*a* hereinafter.

FIG. 257*a* illustrates Call Taxi Data CTD sent from Communication Device 200 to Host H (FIG. 243) as explained in S5 of FIG. 257. As described in FIG. 257*a*, Call Taxi Data CTD is composed of Header CTD1, Host ID CTD2, Caller ID CTD3, Taxi ID CTD4, and Footer CTD5. Here, Host ID CTD2 is the recipient of Call Taxi Data CTD, Caller ID CTD3 is the sender of Call Taxi Data CTD, and Taxi ID CTD4 is the identification of Taxi TxS selected in S4 of FIG. 257. Header CTD1 and Footer CTD5 represent the beginning and end of Call Taxi Data CTD respectively.

FIG. 258 illustrates the response by Host H (FIG. 243) when Call Taxi Data CTD (FIG. 257*a*) is received. As described in FIG. 258, Host H periodically checks the incoming signal (S1). If the incoming signal is Call Taxi Data CTD (S2), Host H retrieves the identification of Taxi TxS (i.e., Taxi ID CTD4 in FIG. 257*a*) therefrom, and calculates the approaching route data (S3). The approaching route data is the data for the selected taxi to approach to the pick up location from its current location. Here, Host H takes into consideration the attribution data stored in Attribution Data Storage Area H11*d* (FIG. 254), such as road blocks, traffic accidents, and road constructions, and traffic jams when calculating the approaching route data. Next, Host H sends to Taxi TxS the Pick Up Information Data (S4), the Estimated Information Data (S5), and the approaching route data (S6), each of which are explained in FIGS. 259*a*, 259*b*, and 259*c* respectively hereinafter. After the foregoing sequence is completed, Host H changes the field 'Status' (FIG. 254*b*) of the selected taxi to 'Occupied' (S7).

FIG. 259*a* illustrates Pick Up Information Data PUID sent from Host H (FIG. 243) to Taxi TxS. As described in FIG. 259*a*, Pick Up Information Data PUID is composed of Header PUID1, Taxi ID PUID2, Host ID PUID3, Pick Up Location Data PUID4, Pick Up Time Data PUID5, Passenger Number Data PUID6, Destination Data PUID7, Caller ID PUID8, and Footer PUID9. Here, Taxi ID PUID2 is the recipient of Pick Up Information Data PUID, i.e., the identification of Taxi TxS, and Host ID PUID3 is the sender of Pick Up Information Data PUID. Pick up location data PUID4 is the geographic location data produced by the software program described in FIG. 247, which is identical to Pick Up Location Data TID3 in FIG. 252, Pick Up Time Data PUID5 is the data produced by the software program described in FIG. 248, which is identical to Pick Up Time Data TID4 in FIG. 252, Passenger Number Data PUID6 is the data produced by the software program described in FIG. 249, which is identical to Passenger Number Data TID5 in FIG. 252, Destination Data PUID7 is the data produced by the software program produced in FIG. 250, which is identical to Destination Data TID6 in FIG. 252, and Caller ID PUID8 is an identification number of Communication Device 200 (e.g., the phone number designated thereto), which is identical to Caller ID TID2 in FIG. 252. Header PUID1 and Footer PUID9 represent the beginning and end of Pick Up Information Data PUID respectively.

FIG. 259*b* illustrates Estimated Information Data EIDa sent from Host H (FIG. 243) to Taxi TxS. As described in FIG. 259*b*, Estimated Information Data EIDa is composed of Header EIDa1, Taxi ID EIDa2, Host ID EIDa3, Estimated Waiting Time Data EIDa4, Estimated Price Data EIDa5, Estimated Best Route Data EIDa6, and Footer EIDa7. Here, Taxi ID EIDa2 is the recipient of Estimated Information Data EIDa, Host ID EIDa3 is the sender of Estimated Information Data EIDa, Estimated Waiting Time Data EIDa4 is the data calculated in S4 of FIG. 255 for Taxi TxS, Estimated Price Data EIDa5 is the data calculated in S5 of FIG. 255 for Taxi TxS, and Estimated Best Route Data EIDa6 is the data produced in S6 of FIG. 255, which is identical to Best Route Data EID6 in FIG. 256. Header EIDa1 and Footer EIDa7 represent the beginning and end of Estimated Information Data EID respectively.

FIG. 259*c* illustrates Approaching Route Data ARD sent from Host H (FIG. 243) to TxS. As described in FIG. 259*c*, Approaching Route Data ARD is composed of Header ARD1, Taxi ID ARD2, Host ID ARD3, Approaching Route Data ARD4, and Footer ARD. Here, Taxi ID ARD2 is the recipient of Approaching Route Data ARD, Host ID ARD3 is the sender of Approaching Route Data ARD, and Approaching Route Data ARD4 is the data produced in S3 of FIG. 258. Header ARD1 and Footer ARD5 represent the beginning and end of Approaching Route Data ARD respectively.

FIG. 260 illustrates a software program stored in Taxi TxS which notifies Host H (FIG. 243) the current location of Taxi TxS. As described in FIG. 260, Taxi TxS periodically checks its current geographical location (S1). Taxi TxS then sends in a wireless fashion to Host H Taxi Current Location Data TCLD which includes the current geographical location of which the details are described in FIG. 261 hereinafter (S2).

FIG. 261 illustrates Taxi Current Location Data TCLD sent from Taxi TxS to Host H (FIG. 243) explained in FIG. 260. As described in FIG. 261, Taxi Current Location Data TCLD is composed of Header TCLD1, Host ID TCLD2, Taxi ID TCLD3, Taxi Current Location Data TCLD4, and Footer TCLD5. Here, Host ID TCLD2 is the recipient of Taxi Current Location Data TCLD, Taxi ID TCLD3 is the sender of Taxi Current Location Data, and Taxi Current Location Data TCLD4 is the data produced in S1 of FIG. 260. Header TCLD1 and Footer TCLD5 represent the beginning and end of Taxi Current Location Data TCLD respectively.

FIG. 262 illustrates the response of Host H (FIG. 243) when receiving Taxi Current Location Data TCLD described in FIG. 261. As described in FIG. 262, Host H periodically checks the incoming signal (S1). If the incoming signal is Taxi Current Location Data TCLD (S2), Host H calculates and thereby updates the estimated waiting time based on the just received Taxi Current Location Data TCLD (S3). Host H then sends to Communication Device 200 Updated Taxi Current Information Data UTCID of which the details area explained in FIG. 263 hereinafter (S4).

FIG. 263 illustrates Updated Taxi Current Information Data UTCID sent in S4 of FIG. 262. As described in FIG. 263, Updated Taxi Current Information Data UTCID is composed of Header UTCID1, Caller ID UTCID2, Host ID UTCID3, Taxi ID UTCID4, Taxi Current Location Data UTCID5, 3D Map UTCID6, Estimated Waiting Time Data UTCID7, and Footer UTCID8. Here, Caller ID UTCID2 is the recipient of Taxi Current Information Data UTCID, Host ID UTCID3 is the sender of Taxi Current Information Data UTCID, Taxi ID UTCID4 is the identification of Taxi TxS, Taxi Current Location Data UTCID5 is the current geographical location of Taxi TxS which is identical to Taxi Current Location Data TCLD4 in FIG. 261, 3D Map UTCID6, a three-dimensional map data, which is retrieved from 3D Map Storage Area H11*e* (FIG. 254) and which is designed to be displayed on LCD 201 (FIG. 1) to indicate current geographical location of Taxi TxS and the pick up location, and Estimated Waiting Time Data UTCID7 is the data produced in S3 of FIG. 262. Header UTCID1 and Footer UTCID8 represent the beginning and end of Updated Taxi Current Information Data UTCID respectively.

FIG. 264 illustrates one of the software programs stored in Call Taxi Software Storage Area 20611*b* (FIG. 244*a*) which is executed when Updated Taxi Current Information Data UTCID (FIG. 263) is received. As described in FIG. 264, CPU 211 (FIG. 1) periodically checks the incoming signal (S1). If the incoming signal is Updated Taxi Current Information Data UTCID (S2), CPU 211 retrieves 3D Map UTCID6 therefrom and displays on LCD 201 (FIG. 1) (S3). Next, CPU 211 retrieves Taxi ID UTCID4, Taxi Current Location Data UTCID5, and Estimated Waiting Time Data UTCID7 and displays on LCD 201 (S4) with the current location of Communication Device 200 (S5).

FIGS. 265 through 269 are of the explanations after Taxi TxS has arrived to the pick up location.

FIG. 265 illustrates a software program stored in Taxi TxS which notifies Host H (FIG. 243) the current location of Taxi TxS. As described in FIG. 265, Taxi TxS periodically checks its current geographical location (S1). Taxi TxS then sends to Host H Taxi Current Location Data TCLDa which includes the current geographical location of which the details are described in FIG. 266 hereinafter (S2).

FIG. 266 illustrates Taxi Current Location Data TCLDa sent from Taxi TxS to Host H (FIG. 243) explained in FIG. 265. As described in FIG. 266, Taxi Current Location Data TCLDa is composed of Header TCLDa1, Host ID TCLDa2, Taxi ID TCLDa3, Taxi Current Location Data TCLDa4, and Footer TCLDa5. Here, Host ID TCLDa2 is the recipient of Taxi Current Location Data TCLDa, Taxi ID TCLDa3 is the sender of Taxi Current Location Data, and Taxi Current Location Data TCLDa4 is the data produced in S1 of FIG. 265. Header TCLDa1 and Footer TCLDa5 represent the beginning and end of Taxi Current Location Data TCLDa respectively.

FIG. 267 illustrates the response of Host H (FIG. 243) when receiving Taxi Current Location Data TCLDa described in FIG. 266. As described in FIG. 267, Host H periodically checks the incoming signal (S1). If the incoming signal is Taxi Current Location Data TCLDa (S2), Host H calculates and thereby updates the estimated waiting time based on the just received Taxi Current Location Data TCLDa (S3). Host H then sends to Communication Device 200 updated Estimated Destination Arrival Time Data UEDATD of which the details are explained in FIG. 268 hereinafter.

FIG. 268 illustrates updated Estimated Destination Arrival Time Data UEDATD sent in S4 of FIG. 267. As described in FIG. 268, updated Estimated Destination Arrival Time Data UEDATD is composed of Header UEDATD1, Caller ID UEDATD2, Host ID UEDATD3, Taxi ID UEDATD4, Taxi Current Location Data UEDATD5, 3D Map UEDATD6, Estimated Waiting Time Data UEDATD7, and Footer UEDATD8. Here, Caller ID UEDATD2 is the recipient of updated Estimated Destination Arrival Time Data UEDATD, Host ID UEDATD3 is the sender of updated Estimated Destination Arrival Time Data UEDATD, Taxi ID UEDATD4 is the identification of Taxi TxS, Taxi Current Location Data UEDATD5 is the current geographical location of Taxi TxS, 3D Map UEDATD6 is a three-dimensional map data which is retrieved from 3D Map Storage Area H11*e* (FIG. 254) and which is designed to be displayed on LCD 201 (FIG. 1) to indicate current geographical location of Taxi TxS and the pick up location, and Estimated Waiting Time Data UEDATD7 is the data produced in S3 of FIG. 262. Header UEDATD1 and Footer UEDATD8 represent the beginning and end of updated Estimated Destination Arrival Time Data UEDATD respectively.

FIG. 269 illustrates one of the software programs stored in Call Taxi Software Storage Area 20611*b* (FIG. 244*a*) which is executed when updated Estimated Destination Arrival Time Data UEDATD (FIG. 268) is received. As described in FIG. 269, CPU 211 (FIG. 1) periodically checks the incoming signal (S1). If the incoming signal is updated Estimated Destination Arrival Time Data UEDATD (S2), CPU 211 retrieves 3D Map UEDATD6 therefrom and displays on LCD 201 (FIG. 1) (S3). Next, CPU 211 retrieves Taxi ID UEDATD4, Taxi Current Location Data UEDATD5, and Estimated Destination Arrival Time Data UEDATD7 and displays on LCD 201 (S4) with the current location of Communication Device 200 (S5).

<<Shooting Video Game Function>>

FIGS. 270 through 283 illustrate the shooting video game function of Communication Device 200 which enables the user often enjoy a 'shooting video game' by the implementation thereof.

FIG. 270 illustrates the typical image displayed on LCD 201 (FIG. 1) at the time the shooting video game function is implemented. As described in FIG. 270, primarily four types of objects are displayed on LCD 201, i.e., CPU Controlled Object CCO, User Controlled Object UCO, User Fired Bullet UFB, and CPU Fired Bullet CFB. Here, CPU Controlled Object CCO is a three-dimensional object of which the movement is controlled by CPU 211 (FIG. 1) and which is not controllable by the operation of the user of Communication Device 200. CPU Controlled Object CCO is primarily programmed to 'attack' User Controlled Object UCO. In the example described in FIG. 270, two CPU Controlled Object CCOs are displayed on LCD 201. User Controlled Object UCO is a three-dimensional object of which the movement is controlled by user of Communication Device 200. User Fired Bullet UFB is a three-dimensional object which is fired from User Controlled Object UCO to primarily 'attack' CPU Controlled Object CCO or defend User Controlled Object UCO therefrom. User Fired Bullet UFB is fired by the operation of the user of Communication Device 200. CPU Fired Bullet CFB is a three-dimensional object which is fired from CPU Controlled Object CCO to primarily 'attack' User Controlled Object UCO or defend CPU Controlled Object CCO therefrom. CPU Fired Bullet CFB is fired under the operation of CPU 211 and is not controllable by the operation of the user of Communication Device 200.

FIG. 271 illustrates the data transferred from Host H (FIG. 136) to Communication Device 200, i.e., Transferred Shooting Game Data TSGD in a wireless fashion, which is stored in Game DL Data Storage Area 2061*b* (FIG. 138). As described in FIG. 271, Transferred Shooting Game Data TSGD is primarily composed of Header TSGD1, Shooting Video Game Program TSGD2, Object Image Data TSGD3, Background Image Data TSGD4, Sound Data TSGD5, and Footer TSGD6. Here, Shooting Video Game Program TSGD2 is a package of software programs which is decompressed and stored in Game Software Storage Area 2061*d* (FIG. 141) wherein each software program is explained in details in FIGS. 272 through 283. Object Image Data TSGD3 is a package of data regarding the three-dimensional objects, such as CPU Controlled Object CCO, User Controlled Object UCO, User Fired Bullet UFB, and CPU Fired Bullet CFB described in FIG. 270. Background Image Data TSGD4 is a package of data regarding the two-dimensional and/or three-dimensional image data to display Background BKG described in FIG. 270. Sound data TSGD5 is a package of sound data which is designed to be output from Speaker 216 (FIG. 1). Header TSGD1 and Footer TSGD6 represent the beginning and end of Transferred Shooting Game Data TSGD respectively.

FIGS. 136 through 141, and FIG. 143 apply to implement the shooting video game function. More precisely, the present function is one of the games stored in Host Game Data Storage Area Ha (FIG. 136) which is selected and downloaded as described in FIG. 140.

FIGS. 143 and 272 illustrate the process to allocate Input Device 210 (FIG. 1) to implement the shooting video game function. As described in FIG. 143, when the game initiation process is initiated as explained in S1 of FIG. 142, the key allocation process is initiated simultaneously. As the result of the key allocation process, Input Device 210 normally utilized for communication purposes, including a keypad and buttons, is allocated as input means for performing the shooting video game function. In the example described in FIG. 272, Key #1 is assigned for instructing CPU 211 (FIG. 1) to move up User Controlled Object UCO (FIG. 270), Key #2 is assigned for instructing CPU 211 to move down User Controlled Object UCO, Key #3 is assigned for instructing CPU 211 to move forward User Controlled Object UCO, Key #4 is assigned for instructing CPU 211 to move backward User Controlled Object UCO, and Key #5 is assigned for instructing CPU 211 to fire User Fired Bullet UFB, and all the foregoing data are stored in Key Allocation Data Storage Area 2061*h*.

FIG. 273 illustrates the overall process of the software program stored in Game Software Storage Area 2061*d* (FIG. 141). As described in FIG. 273, CPU 211 (FIG. 1) displays one or more of CPU Controlled Object CCOs (FIG. 270) on LCD 201 (FIG. 1) (S1). CPU 211 displays CPU Controlled Object CCO by retrieving the three-dimensional data regarding its shape and all parts thereof stored in 3D Object Data Storage Area 2061*e* (FIG. 141), and by 'pasting' the relevant textures thereto stored in Texture Data Storage Area 2061*f* (FIG. 141). User Controlled Object UCO (FIG. 270) (S2) and Background BKG (FIG. 270) (S3) are also displayed on LCD 201 in the same manner by retrieving data from 3D Object Data Storage Area 2061*e* and Texture Data Storage Area 2061*f*.

FIG. 274 illustrates the software program stored in Game Software Storage Area 2061*d* (FIG. 141) to move User Controlled Object UCO (FIG. 270) displayed on LCD 201 (FIG. 1). First of all, the user of Communication Device 200 manipulates Input Device 210 (FIG. 1), and the input control signal produced therefrom is transferred to CPU 211 (FIG. 1) (S1). CPU 211 then moves User Controlled Object UCO displayed on LCD 201 in accordance to the input control signal by referring to Key Allocation Data Storage Area 2061*h* (FIG. 272) (S2). For example, CPU 211 moves up User Controlled Object UCO (FIG. 270) when the input control signal representing Key #1 is transferred to CPU 211, CPU 211 moves down User Controlled Object UCO (FIG. 270) when the input control signal representing Key #2 is transferred to CPU 211, CPU 211 moves forward User Controlled Object UCO (FIG. 270) when the input control signal representing Key #3 is transferred to CPU 211, and CPU 211 moves backward User Controlled Object UCO (FIG. 270) when the input control signal representing Key #4 is transferred to CPU 211.

FIG. 275 illustrates the software program stored in Game Software Storage Area 2061*d* (FIG. 141) to move CPU Controlled Object CCO (FIG. 270) displayed on LCD 201 (FIG. 1). CPU 211 (FIG. 1) moves CPU Controlled Object CCO in the predetermined manner written in Game Software Storage Area 2061*d* (S1). Unlike User Controlled Object UCO (FIG. 270), CPU Controlled Object CCO is not controllable by the operation of the user of Communication Device 200.

FIG. 276 illustrates the software program stored in Game Software Storage Area 2061*d* (FIG. 141) to display User Fired Bullet UFB (FIG. 270) on LCD 201 (FIG. 1). First of all, the user of Communication Device 200 manipulates Input Device 210 (FIG. 1) and the input firing signal produced therefrom is transferred to CPU 211 (FIG. 1) (S1). CPU 211 then initiates the user fired bullet process which is explained in details in FIG. 277 hereinafter (S2).

FIG. 277 illustrates the user fired bullet process described in S2 of FIG. 276. When user fired bullet process is initiated, CPU 211 (FIG. 1), first of all, determines the direction of User Fired Bullet UFB (FIG. 270) to which it is fired (S1). CPU 211 then displays User Fired Bullet UFB on LCD 201 (FIG. 1) (S2), and moves it with the predetermined velocity to the direction determined in S1 (S3).

FIG. 278 illustrates the software program stored in Game Software Storage Area 2061*d* (FIG. 141) to determine whether User Fired Bullet UFB (FIG. 270) has hit one of CPU Controlled Object CCOs (FIG. 270) displayed on LCD 201 (FIG. 1). First of all, CPU 211 (FIG. 1) calculates the current position of User Fired Bullet UFB (S1), and then calculates the current position of each of CPU Controlled Object CCO (S2). If the two values produced from S1 and S2 match (S3), CPU 211 initiates the hit program of which the details are explained in FIG. 279 hereinafter (S4).

FIG. 279 illustrates the hit program described in S4 of FIG. 278. When hit program is initiated, CPU 211 (FIG. 1), first of all, displays an explosion image on LCD 201 (FIG. 1) by reading the three-dimensional data of User Fired Bullet UFB from 3D Object Data Storage Area 2061*e* (FIG. 141) and by 'pasting' the relevant textures thereto stored in Texture Data Storage Area 2061*f* (FIG. 141) (S1). Next, CPU 211 erases the image of CPU Controlled Object CCO (FIG. 270) from LCD 201 (S2), and also the explosion image thereafter (S3).

FIG. 280 illustrates the software program stored in Game Software Storage Area 2061*d* (FIG. 141) to display CPU Fired Bullet CFB (FIG. 270) on LCD 201 (FIG. 1). As described in FIG. 280, S1 of FIG. 276 (i.e., the user of Communication Device 200 manipulating Input Device 210 (FIG. 1) and the input firing signal produced therefrom being transferred to CPU 211 (FIG. 1)) is omitted when CPU Controlled Object CCO (FIG. 270) fires CPU Fired Bullet CFB. CPU 211 (FIG. 1) initiates the CPU fired bullet process which is explained in details in FIG. 281 hereinafter (S1).

FIG. 281 illustrates the CPU fired bullet process described in S1 of FIG. 280. When CPU Fired Bullet CFB (FIG. 270) process is initiated, CPU 211 (FIG. 1), first of all, determines the direction of CPU Fired Bullet CFB to which it is fired (S1). CPU 211 then displays CPU Fired Bullet CFB on LCD 201 (FIG. 1) (S2), and moves it with the predetermined velocity to the direction determined in S1 (S3).

FIG. 282 illustrates the software program stored in Game Software Storage Area 2061*d* (FIG. 141) to determine whether CPU Fired Bullet CFB (FIG. 270) has hit User Controlled Object UCO (FIG. 270) displayed on LCD 201 (FIG. 1). First of all, CPU 211 (FIG. 1) calculates the current position of CPU Fired Bullet CFB (S1), and then calculates the current position of User Controlled Object UCO (S2). If the two values produced from S1 and S2 match (S3), CPU 211 initiates the hit program of which the details are explained in FIG. 283 hereinafter (S4).

FIG. 283 illustrates the hit program described in S4 of FIG. 282. When hit program is initiated, CPU 211 (FIG. 1), first of all, displays an explosion image on LCD 201 (FIG. 1) by reading the three-dimensional data of CPU Fired Bullet CFB from 3D Object Data Storage Area 2061*e* (FIG. 141) and by 'pasting' the relevant textures thereto stored in Texture Data Storage Area 2061*f* (FIG. 141) (S1). Next, CPU 211 erases the image of User Controlled Object UCO (FIG. 270) from LCD 201 (S2), and also the explosion image thereafter (S3).

<<Driving Video Game Function>>

FIGS. 284 through 294 illustrate the driving video game function of Communication Device 200. The user of Communication Device 200 is enabled to enjoy a 'driving video game' by the implementation of this function.

FIG. 284 illustrates the typical image displayed on LCD 201 (FIG. 1) at the time the driving video game function is implemented. As described in FIG. 284, primarily two types of cars are displayed on LCD 201, i.e., CPU Controlled Car CCC and User Controlled Car UCC. Here, CPU Controlled Car CCC is a three-dimensional image of a car of which the movement is controlled by CPU 211 (FIG. 1) and which is not controllable by the operation of the user of Communication Device 200. CPU Controlled Car CCC is primarily programmed to race with User Controlled Car UCC. Two CPU Controlled Car CCCs are displayed on LCD 201 in the example described in FIG. 284. User Controlled Car UCC is a three-dimensional image of a car of which the movement is controlled by the user of Communication Device 200. In FIG. 284, Street Image STIm is a series of images of the circuit on which both CPU Controlled Car CCC and User Controlled Car UCC are programmed to travel. Background Image BGIm is a series of images of the background displayed on LCD 201, such as, but not limited to, spectators, clouds, and trees.

FIG. 285 illustrates the data transferred from Host H to Communication Device 200, i.e., Transferred Driving Game Data TDGD in a wireless fashion, which is stored in Game DL Data Storage Area 2061*b* (FIG. 138). As described in FIG. 285, Transferred Driving Game Data TDGD is primarily composed of Header TDGD1, Driving Video Game Program TDGD2, Driving Video Game Parameter TDGD3, Object Image Data TDGD4, Background Image Data TDGD5, Street Image Data TDGD6, Sound Data TDGD7, and Footer TDGD8. Here, Driving Video Game Program TDGD2 is a package of software programs which is decompressed and stored in Game Software Storage Area 2061*d* (FIG. 141) wherein each software program is explained in details hereinafter. Driving Video Game Parameter TDGD3 is a package of parameters which is decompressed and stored in Game Process Data Storage Area 2061*g* (FIG. 141). Object Image data TDGD4 is a package of data regarding the three-dimensional objects, such as CPU Controlled Object CCO and User Controlled Object UCO described in FIG. 284. Background Image Data TDGD5 is a package of data regarding the two-dimensional and/or three-dimensional image data to display Background Image BGIm (FIG. 284), such as spectators, clouds, and trees. Street Image Data TDGD6 is a package of data regarding the two-dimensional and/or three-dimensional image data to display the surface of the circuit, Street Image STIm (FIG. 284), on which CPU Controlled Car CCC (FIG. 284) and User Controlled Car UCC (FIG. 284) travel. Header TDGD1 and Footer TDGD8 represent the beginning and end of Transferred Driving Game Data TDGD respectively.

FIGS. 136 through 141, and 143 apply to implement the driving video game function. More precisely, the present function is one of the games stored in Host Game Data Storage Area Ha (FIG. 136).

FIG. 286 illustrates the data stored in Game Process Data Storage Area 2061*g* (FIG. 141). As described in FIG. 286, Game Process Data Storage Area 2061*g* includes three storage areas, i.e., CPU Controlled Car Parameter Storage Area 2061*g*1, Street Parameter Storage Area 2061*g*2, and Background Parameter Storage Area 2061*g*3. CPU Controlled Car Parameter Storage Area 2061*g*1 stores a set of parameters for each CPU Controlled Car CCC (FIG. 284) displayed on LCD 201 (FIG. 1), such as the maximum speed and the cornering capability thereof. Street parameter storage Area 2061*g*2 stores a set of parameters regarding the road condition of the circuit, i.e., Street Image STIm (FIG. 284) displayed on LCD 201. For example, some sections of the circuit are slippery due to the parameter which makes the user of Communication Device 200 difficult to steer the wheel of User Controlled Car UCC (FIG. 284). Background parameter storage Area 2061*g*3 stores a set of parameters regarding the Background Image BGIm (FIG. 284), such as the climate, the number of spectators, the number of clouds, and the number of trees displayed on LCD 201.

FIGS. 143 and 287 illustrate the process to allocate Input Device 210 (FIG. 1) to implement the driving video game function. As described in FIG. 143, when the game initiation process is initiated as explained in S1 of FIG. 142, the key allocation process is initiated simultaneously. As the result of the key allocation process, Input Device 210 normally utilized for communication purposes, including keypad and buttons, is allocated as input means for performing the game function. In the example described in FIG. 287, Key #1 is assigned for instructing CPU 211 (FIG. 1) to move up User Controlled Car UCC (FIG. 284), Key #2 is assigned for instructing CPU 211 to move down User Controlled Car UCC, Key #3 is assigned for instructing CPU 211 to move forward User Controlled Car UCC, Key #4 is assigned for instructing CPU 211 to move backward User Controlled Car UCC, Key #5 is assigned for instructing CPU 211 to increase the traveling speed of User Controlled Car UCC, and Key #6 is assigned for instructing CPU 211 to decrease the traveling speed of User Controlled Car UCC, and all the foregoing data are stored in Key Allocation Data Storage Area 2061*h* (FIG. 144).

FIG. 288 illustrates the overall process of the driving video game function of Communication Device 200. As described in FIG. 288, CPU 211 (FIG. 1) performs the user controlled car process (S1), the CPU controlled car process for all CPU Controlled Car CCCs (FIG. 284) displayed on LCD 201 (FIG. 1) (S2), the street image process (S3), and the background image process (S4). The details of each process are explained in FIGS. 289 through 292 respectively.

FIG. 289 illustrates the details of the user controlled car process explained in S1 of FIG. 288. First of all, the user of Communication Device 200 manipulates the operation of User Controlled Car UCC (FIG. 284) displayed on LCD 201 (FIG. 1) by Input Device 210 (FIG. 1) or via voice recognition system, and the input control signal produced therefrom is transferred to CPU 211 (FIG. 1) (S1). Upon receiving the input control signal, CPU 211 refers to Key Allocation Data Storage Area 2061*h* (FIG. 287) and determines the speed and the direction of User Controlled Car UCC (S2), and displays the image of User Controlled Car UCC on LCD 201 perceived from a predetermined view point (S3).

FIG. 290 illustrates the details of the CPU controlled car process explained in S2 of FIG. 288. First of all, CPU 211 (FIG. 1) periodically refers to CPU Controlled Car Parameter Storage Area 2061*g*1 (FIG. 286) (S1), and determines the speed and the direction of CPU Controlled Car CCC (FIG. 284) (S2). CPU 211 then displays the image of CPU Controlled Car CCC on LCD 201 perceived from a predetermined view point (S3). The process from S1 through S3 explained in FIG. 290 is performed for each CPU Controlled Car CCC (FIG. 284).

FIG. 291 illustrates the details of the street image process explained in S3 of FIG. 288. First of all, CPU 211 (FIG. 1) periodically refers to Street Parameter Storage Area 2061*g*2 (FIG. 286) (S1), and determines the current road condition by the parameter stored therein (S2). CPU 211 then displays, in accordance with the parameter, Street Image STIm (FIG. 284) on LCD 201 (FIG. 1) perceived from a predetermined view point (S3).

FIG. 292 illustrates the details of the background image process explained in S4 of FIG. 288. First of all, CPU 211 (FIG. 1) periodically refers to Background Parameter Storage Area 2061*g*3 (FIG. 286) (S1), and determines the current layout of Background Image BGIm (FIG. 284) by the parameter stored therein (S2). CPU 211 then displays, in accordance with the parameter, Background Image BGIm (FIG. 284) on LCD 201 (FIG. 1) perceived from a predetermined view point (S3).

FIG. 293 illustrates another embodiment of the present function which enables to display on LCD 201 (FIG. 1) User Controlled Car UCC (FIG. 284) and CPU Controlled Car CCC (FIG. 284) from a different view point. In the example described in FIG. 293, User Controlled Car UCC and CPU Controlled Car CCC are viewed from the upper side whereas both objects are viewed from the rear side in the example described in FIG. 284. The view point is selected by Input Device 210 (FIG. 1) or via voice recognition system.

FIG. 294 illustrates the process to select the view point. As described in FIG. 294, an input view selection signal is input by Input Device 210 (FIG. 1) or via voice recognition system (S1), and CPU 211 (FIG. 1) changes the view point in accordance with the input view selection signal (S2). As a result of such selection, the displaying process described in S3 of FIG. 289 (displaying User Controlled Car UCC (FIG. 284)), S3 of FIG. 290 (displaying CPU Controlled Car CCC (FIG. 284)), S3 of FIG. 291 (displaying Street Image STIm), and S4 of FIG. 292 (displaying Background Image BGIm) are performed respectively from the view point determined in S2.

<<Address Book Updating Function>>

FIGS. 295 through 312 illustrate the address book updating function of Communication Device 200 which updates the address book stored in Communication Device 200 by a personal computer via network (e.g., the Internet).

FIG. 295 illustrates the basic elements necessary to implement the address book updating function which is explained in details hereinafter. As described in FIG. 295, Personal Computer PC, Host H, and Communication Device 200 are connected to Network NT in a wireless fashion. Here, Personal Computer PC is capable to access Host H via Network NT, and Host H is capable to access Communication Device 200 via Network NT.

FIG. 296 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the address book updating function is activated (S3*c*) when the address book updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 297 illustrates the data stored in RAM 206 (FIG. 1). As described in FIG. 297, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the address book updating function is stored in Address Book Information Storage Area 20612*a*.

FIG. 298 illustrates the method to input new address via Personal Computer PC (FIG. 295). Here, Personal Computer PC is an ordinary personal computer which includes a keyboard and a mouse as input devices. As described in FIG. 298, a web page is shown on a display of Personal Computer PC (S1). The user of Personal Computer PC inputs his/her user ID via keyboard to display his/her own user's page (S2). Once his/her user's page is opened (S3), the user of Personal Computer PC selects the address book displayed thereon (S4) to open and display his/her own address book (S5). The user of Personal Computer PC then inputs a new address into the address book via keyboard (S6), and registers it by clicking a confirmation button displayed therein with a mouse (S7). The registered new address is transferred from Personal Computer PC to Host H via Network NT (FIG. 295) together with the user ID input in S2 (FIG. 295).

FIG. 299 illustrates the information stored in the address book explained in FIG. 298. Address book is composed of a plurality of Address Data AD. As described in FIG. 299, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 300 illustrates the data stored in Host H (FIG. 295). As described in FIG. 300, Host H includes Users' Address Book Data Storage Area H12*a* which is explained in details in FIG. 301 hereinafter.

FIG. 301 illustrates the information stored in Users' Address Book Data Storage Area H12*a*. Users' Address Book Data Storage Area H12*a* stores address book data of each user. In the example described in FIG. 301, Users' Address Book Data Storage Area H12*a* stores address book data ABDa of user A, address book data ABDb of user B, address book data ABDc of user C, address book data ABDd of user D, and address book data ABDe of user E. Each of address book data ABDa, address book data ABDb, address book data ABDc, address book data ABDd, and address book data ABDe stores a plurality of Address Data AD explained in FIG. 299.

FIG. 302 illustrates one example of the address book data stored in Users' Address Book Data Storage Area H12*a* (FIG. 301). In the example described in FIG. 302, address book data ABDa of user A (FIG. 301) stores a plurality of address data, i.e., Address Data ADf of user F, Address Data ADg of user G, Address Data ADh of user H, Address Data ADi of user I, and Address Data ADj of user J. Each of Address Data ADf, Address Data ADg, Address Data ADh, Address Data ADi, and Address Data ADj is composed of data explained in FIG. 299.

FIG. 303 illustrates the sequence of updating the address book data stored in Users' Address Book Data Storage Area H12*a* (FIG. 301). As described in FIG. 303, Host H (FIG. 295) retrieves the user ID from the transferred data described in S8 of FIG. 298, and identifies address book data which is updated thereafter (S2).

FIG. 304 illustrates one example of the updated address book data stored in Users' Address Book Data Storage Area H12*a* (FIG. 301). In the example described in FIG. 304, address book data ABDa of user A stored in Users' Address Book Data Storage Area H12*a* (FIG. 301), which originally stored Address Data ADf of user F, Address Data ADg of user G, address data ADh of user H, Address Data ADi of user I, and Address Data ADj of user J, as described in FIG. 302, is updated by adding new Address Data ADk of user K as shown in the present drawing figure.

FIG. 305 illustrates the next process after updating the address book data as described in FIGS. 303 and 304. As described in FIG. 305, Host H (FIG. 295) selects the user ID of address book data ABD which has been just updated (S1). In the example described in FIG. 304, user A of address book data ABDa is selected. Next, Host H is connected to Communication Device 200 of user A via Network NT (FIG. 295) (S2), and transfers the new address data which is Address Data ADk of user K in the example described in FIG. 304 (S3).

FIG. 306 illustrates the data stored in Address Book Information Storage Area 20612*a* (FIG. 297). As described in FIG. 306, Address Book Information Storage Area 20612*a* includes Address Book Software Storage Area 20612*b* and Address Book Data Storage Area 20612*c*. Here, Address Book Software Storage Area 20612*b* stores a software program which is explained in details in FIG. 308, and Address Book Data Storage Area 20612*c* stores the data which is explained in details in FIG. 307 hereinafter.

FIG. 307 illustrates one example of the address book data stored in Address Book Data Storage Area 20612*c* (FIG. 306) before being updated. In the example described in FIG. 307, Address Book Data Storage Area 20612*c* of Communication Device 200 owned by user A stores a plurality of address data, i.e., Address Data ADf of user F, Address Data ADg of user G, Address Data ADh of user H, Address Data ADi of user I, and Address Data ADj of user J. Each of address data ADf, Address Data ADg, Address Data ADh, Address Data ADi, and Address Data ADj is composed of data explained in FIG. 299. Address Book Data Storage Area 20612*c* of Communication Device 200 is periodically synchronized with address book data ABD (FIG. 302) of Host H, thereby both data are identical.

FIG. 308 illustrates the sequence of updating data stored in Address Book Data Storage Area 20612*c* (FIG. 306). As described in FIG. 308, Communication Device 200 is connected to Host H (FIG. 295) by the control of CPU 211 (FIG. 1) (S1) and receives new address data transferred by Host H as described in S3 of FIG. 305 (S2). CPU 211 retrieves new address data therefrom and updates Address Book Data Storage Area 20612*c* accordingly (S3).

FIG. 309 illustrates one example of the updated address book data stored in Address Book Data Storage Area 20612*c* (FIG. 306). In the example described in FIG. 309, address book data ABDa of user A stored in Address Book Data Storage Area 20612*c* (FIG. 307) which originally stored Address Data ADf of user F, Address Data ADg of user G, Address Data ADh of user H, Address Data ADi of user I, and Address Data ADj of user J, as described in FIG. 307, is updated by adding new Address Data ADk of user K as shown in the present drawing figure.

The method to modify one portion of Address Data AD described in FIG. 299 (for example, Home Address and Email) is illustrated in FIGS. 310 through 312. The explanations of FIGS. 299 through 303 and FIGS. 305 through 308 also apply to this embodiment.

FIG. 310 illustrates the method to modify Address Data AD (FIG. 299) via Personal Computer PC (FIG. 295). Here, Personal Computer PC is an ordinary personal computer which includes a keyboard and a mouse as input device. As described in FIG. 310, a web page is shown on a display of Personal Computer PC (S1). The user of Personal Computer PC inputs his/her user ID via keyboard to display his/her own user's page (S2). Once his/her user's page is opened (S3), the user of Personal Computer PC selects the address book displayed thereon (S4) to open and display his/her own address book (S5). The user of Personal Computer PC then modifies one or more of addresses in the address book via keyboard (S6), and registers it by clicking a confirmation button displayed therein with a mouse (S7). The modified address is transferred from Personal Computer PC to Host H via Network NT (FIG. 295) together with the user ID input in S2 (FIG. 295).

FIG. 311 illustrates one example of the updated address book data stored in Users' Address Book Data Storage Area H12*a* (FIG. 301). In the example described in FIG. 311, address book data ABDa of user A stored in Users' Address Book Data Storage Area H12*a* (FIG. 301) originally stored Address Data ADf of user F, Address Data ADg of user G, Address Data ADh of user H, Address Data ADi of user I, and Address Data ADj of user J, as described in FIG. 302, and is updated by modifying Address Data ADj of user J as shown in the present drawing figure.

FIG. 312 illustrates one example of the updated address book data stored in Address Book Data Storage Area 20612*c* (FIG. 306). In the example described in FIG. 312, address book data ABDa of user A stored in Address Book Data Storage Area 20612*c* (FIG. 307) originally stored Address Data ADf of user F, Address Data ADg of user G, Address Data ADh of user H, Address Data ADi of user I, and Address Data ADj of user J, as described in FIG. 307, and is updated by modifying Address Data ADj of user J as shown in the present drawing figure.

<<Batch Address Book Updating Function—with Host>>

FIGS. 313 through 329 illustrate the batch address book updating function which updates all address books of a plurality of Communication Devices 200 in one action.

FIG. 313 illustrates the basic elements necessary to implement the batch address book updating function which is explained in details hereinafter. As described in FIG. 313, Host H and a plurality of Communication Devices 200 (two devices in the example described in FIG. 313) are connected to Network NT in a wireless fashion. Here, a plurality of Communication Devices 200 are capable to access Host H via Network NT, and Host H is capable to access the plurality of Communication Devices 200 via Network NT.

FIG. 314 illustrates the software program installed in Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the batch address book updating function is activated (S3*c*) when the batch address book updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 315 illustrates the data stored in RAM 206 (FIG. 1). As described in FIG. 315, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the batch address book updating function is stored in Address Book Information Storage Area 20613*a*.

FIG. 316 illustrates the data stored in Host H (FIG. 313). As described in FIG. 316, Host H includes Users' Address Book Data Storage Area H13*a* which is explained in details in FIG. 317 hereinafter.

FIG. 317 illustrates the information stored in Users' Address Book Data Storage Area H13*a*. Users' Address Book Data Storage Area H13*a* stores address data of each user. In the example described in FIG. 317, Users' Address Book Data Storage Area H13*a* stores Address Data ADa of user A, Address Data ADb of user B, Address Data ADc of user C, Address Data ADd of user D, and Address Data ADe of user E. Each of Address Data ADa, Address Data ADb, Address Data ADc, Address Data ADd, and Address Data ADe stores a plurality of Address Data AD explained in FIG. 318 hereinafter.

FIG. 318 illustrates the information stored in each of Address Data ADa through ADe explained in FIG. 317. As described in FIG. 318, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 319 illustrates one example of the updated address data stored in Users' Address Book Data Storage Area H13*a* (FIG. 317). In the example described in FIG. 319, Users' Address Book Data Storage Area H13*a* which originally stored Address Data ADa of user A, Address Data ADb of user B, Address Data ADc of user C, Address Data ADd of user D, and Address Data ADe of user E, as described in FIG. 317, is updated by adding new Address Data ADf of user F as shown in the present drawing figure.

FIG. 320 illustrates the next process after updating the address data as described in FIG. 319. As described in FIG. 320, Host H (FIG. 313) is connected to all Communication Devices 200 (two Communication Devices 200 in the example described in FIG. 313) via Network NT (FIG. 313) (S1), and transfers the new address data which is Address Data ADf of user F in the example described in FIG. 319 (S2).

FIG. 321 illustrates the data stored in Address Book Information Storage Area 20613*a* (FIG. 315) of Communication Device 200. As described in FIG. 321, Address Book Information Storage Area 20613*a* includes Address Book Software Storage Area 20613*b* and Address Book Data Storage Area 20613*c*. Here, Address Book Software Storage Area 20613*b* stores a software program which is explained in details in FIG. 324 hereinafter, and Address Book Data Storage Area 20613*c* stores the data which is explained in details in FIG. 322 hereinafter.

FIG. 322 illustrates one example of the address book data stored in Address Book Data Storage Area 20613*c* (FIG. 321) of all Communication Devices 200 before being updated. In the example described in FIG. 322, Address Book Data Storage Area 20613*c* of Communication Device 200 stores a plurality of address data, i.e., Address Data ADa of user A, Address Data ADb of user B, Address Data ADc of user C, Address Data ADd of user D, and Address Data ADe of user E. Each of Address Data ADa, Address Data ADb, Address Data ADc, Address Data ADd, and Address Data ADe is composed of data explained in FIG. 323 hereinafter. Address Book Data Storage Area 20613*c* of all Communication Devices 200 are periodically synchronized with users' address book data storage are H13*a* (FIG. 317) of Host H (FIG. 313), thereby both data are identical.

FIG. 323 illustrates the information stored in each address data explained in FIG. 322. As described in FIG. 323, Address Data AD is composed of Name, Home Address, Tel, and Email. Here, Name represents the first and last name of a person, Home Address represents the home address where such person resides, Tel represents the telephone number utilized by such person, and Email represents the email address utilized by such person.

FIG. 324 illustrates the sequence of updating data stored in Address Book Data Storage Area 20613*c* (FIG. 321). As described in FIG. 324, all Communication Devices 200 are connected to Host H (FIG. 313) by the control of CPU 211

(FIG. 1) (S1), and each Communication Device 200 receives new address data transferred from Host H as described in S3 of FIG. 320 (S2). CPU 211 retrieves new address data therefrom and updates Address Book Data Storage Area 20613*c* accordingly (S3).

FIG. 325 illustrates one example of the updated address book data stored in Address Book Data Storage Area 20613*c* (FIG. 321). In the example described in FIG. 325, Address Book Data Storage Area 20613*c* which originally stored Address Data ADa of user A, Address Data ADb of user B, Address Data ADc of user C, Address Data ADd of user D, and Address Data ADe of user E, as described in FIG. 322, is updated by adding new Address Data ADf of user F as shown in the present drawing figure.

As another embodiment, the entire data stored in Users' Address Book Data Storage Area H13*a* (FIG. 319), including the new address data (Address Data ADf of user F in the example described in FIG. 319), can be sent to each Communication Device 200 and rewrite the entire data stored in Address Book Data Storage Area 20613*c* (FIG. 321) of Communication Device 200 instead of sending only the new address data (Address Data ADf of user F in the example described in FIG. 319).

The method to modify one portion of Address Data AD described in FIG. 323 (for example, Home Address and Email) is illustrated in FIGS. 326 through 329. The explanations of FIGS. 313 through 318 and FIGS. 321 through 323 also apply to this embodiment.

FIG. 326 illustrates one example of the updated address data stored in Users' Address Book Data Storage Area H13*a* (FIG. 317). In the example described in FIG. 326, Users' Address Book Data Storage Area H13*a* which originally stored Address Data ADa of user A, Address Data ADb of user B, Address Data ADc of user C, Address Data ADd of user D, and Address Data ADe of user E, as described in FIG. 317, is updated by modifying Address Data ADe of user E as shown in the present drawing figure.

FIG. 327 illustrates the next process after modifying the address data as described in FIG. 326. As described in FIG. 327, Host H (FIG. 313) is connected to all Communication Device 200 (two Communication Devices 200 in the example described in FIG. 313) via Network NT (FIG. 313) (S1), and transfers the modified address data which is Address Data ADe of user E in the example described in FIG. 326 (S2).

FIG. 328 illustrates the sequence of modifying data stored in Address Book Data Storage Area 20613*c* (FIG. 321) of Communication Device 200. As described in FIG. 328, all Communication Devices 200 are connected to Host H (FIG. 313) by the control of CPU 211 (FIG. 1) (S1), and each Communication Device 200 receives modified address data transferred by Host H (FIG. 313) as described in S2 of FIG. 327 (S2). CPU 211 retrieves modified address data therefrom and updates Address Book Data Storage Area 20613*c* accordingly (S3).

FIG. 329 illustrates one example of the modified address book data stored in Address Book Data Storage Area 20613*c* (FIG. 321). In the example described in FIG. 329, Address Book Data Storage Area 20613*c* which originally stored Address Data ADa of user A, Address Data ADb of user B, Address Data ADc of user C, Address Data ADd of user D, and Address Data ADe of user E, as described in FIG. 322, is updated by modifying Address Data ADe of user E as shown in the present drawing figure.

As another embodiment, the entire data stored in Users' Address Book Data Storage Area H13*a* (FIG. 326), including the modified address data (Address Data ADe of user E in the example described in FIG. 326), can be sent to each Communication Device 200 and rewrite the entire data stored in Address Book Data Storage Area 20613*c* instead of sending only the modified address data (Address Data ADe of user E in the example described in FIG. 326).

<<Batch Address Book Updating Function—Peer-to-Peer Connection>>

The present invention can also be implemented without utilizing Users' Address Book Data Storage Area H13*a* (FIG. 326) of Host H (FIG. 313). The details of this embodiment is explained in details hereinafter. The descriptions of FIGS. 314, 315, 318, 321 through 323, and 325 also apply to this embodiment.

FIG. 329*a* illustrates the basic elements necessary to implement the batch address book updating function without utilizing Host H (FIG. 313). As described in FIG. 329*a*, a plurality of Communication Devices 200 (two devices in the example described in FIG. 329*a*) are connected to Network NT in a wireless fashion. Here, a plurality of Communication Devices 200 are capable to access each other via Network NT.

FIG. 329*b* illustrates the sequence of Communication Device 200 to update Address Data AD (FIG. 323) which is to be reflected and displayed on the rest of Communication Devices 200. First, CPU 211 (FIG. 1) of Communication Device 200 (e.g., owned by user A in FIG. 329*a*) updates Address Book Data Storage Area 20613*c* by including new address data as described in FIG. 325 or by including modified address data as described in FIG. 329 (S1). CPU 211 of Communication Device 200 then connects to the rest of Communication Device 200 (i.e., the device of user B in FIG. 329*a*) via Network NT (FIG. 329*a*) in a wireless fashion (S2), and sends the updated Address Data AD (S3). Address Book Data Storage Area 20613*c* of Communication Device 200 owned by user B is thereby identical to Address Book Data Storage Area 20613*c* of Communication Device 200 owned by user A.

FIG. 329*c* illustrates the sequence of all Communication Device 200 (i.e., the devices of users A and B in the example described in FIG. 329*a*) to confirm any new address data to be updated. As described in FIG. 329*c*, each Communication Device 200 is periodically connected to the rest of Communication Devices 200 (S1) in order to check whether there are any updated address data (S2). If there are address data to be updated in any of the rest of Communication Devices 200 (S3), each Communication Device 200 retrieves the updated address data from Communication Device 200 which contains thereof (S4). For the avoidance of doubt, 'updated address data' means new address data as described in FIG. 325 and/or modified address data as described in FIG. 329.

<<Batch Scheduler Updating Function—with Host>>

FIGS. 330 through 350 illustrate the batch scheduler updating function which updates all schedulers of a plurality of Communication Devices 200 in one action by utilizing a host.

FIG. 330 illustrates scheduler Sch which is displayed on LCD 201 (FIG. 1) of all Communication Devices 200 implementing the batch scheduler updating function. Referring to FIG. 330, the schedules of Users A, B, and C are displayed on each Communication Device 200 of these users. More precisely, Scheduling Data SchDa1 and SchDa2 of user A, Scheduling Data SchDb1 of user B, and Scheduling Data SchDc1 of user C are displayed on single scheduler Sch.

FIG. 331 illustrates the basic elements necessary to implement the batch scheduler updating function which is explained in details hereinafter. As described in FIG. 331, Host H and a plurality of Communication Devices 200 (three devices for user A, B, and C in the example described in FIG. 331) are connected to Network NT in a wireless fashion.

Here, the plurality of Communication Devices 200 are capable to access Host H via Network NT, and Host H is capable to access the plurality of Communication Devices 200 via Network NT.

FIG. 332 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the batch scheduler updating function is activated (S3*c*) when the batch scheduler updating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 333 illustrates the data stored in RAM 206 (FIG. 1). As described in FIG. 333, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 137, and the data to activate (as described in S3*c* of the previous figure) and to perform the batch scheduler updating function is stored in Scheduling Information Storage Area 20614*a*.

FIG. 334 illustrates the data stored in Scheduling Information Storage Area 20614*a* (FIG. 333). As described in FIG. 334, Scheduling Information Storage Area 20614*a* includes Scheduling Software Storage Area 20614*b* and Scheduling Data Storage Area 20614*c*. Here, Scheduling Software Storage Area 20614*b* stores the software programs which are necessary to implement the present function, such as the ones explained in FIGS. 343, 349, and 351 hereinafter, and Scheduling Data Storage Area 20614*c* stores the data which is explained in details in FIGS. 335 through 340 hereinafter.

FIG. 335 illustrates one example of the scheduling data stored in Scheduling Data Storage Area 20614*c* (FIG. 334) of all Communication Devices 200 before being updated. In the example described in FIG. 335, Scheduling Data Storage Area 20614*c* of Communication Device 200 stores a plurality of scheduling data, i.e., Scheduling Data SchDa of user A, Scheduling Data SchDb of user B, and Address Data ADc of user C in the example. Each of Scheduling Data SchDa, Scheduling Data SchDb, and Scheduling Data SchDc is composed of data explained in FIGS. 336 through 340 hereinafter. Scheduling Data Storage Area 20614*c* of each Communication Device 200 is periodically synchronized with other Communication Devices 200 by the method explained hereinafter.

FIG. 336 illustrates the Scheduling Data SchD stored in Scheduling Data Storage Area 20614*c* (FIG. 335). As described in FIG. 336, Scheduling Data SchD includes 'Subject', 'Importance', 'Date', 'Day', 'Starting Time', 'Ending Time', 'Place' and 'Memo'. Here, 'Subject' represents the subject of a specific schedule, 'Importance' represents the importance of the specific schedule, 'Date' represents the date of the specific schedule, 'Day' represents the day of the specific schedule, 'Starting Time' represents the starting time of the specific schedule, 'Ending Time' represents the ending time of the specific schedule, 'Place' represents the place where the specific schedule is performed, and 'Memo' represents a memo, i.e., a series of alphanumeric data input by the user of Communication Device 200.

FIGS. 337 through 340 illustrate the example of the data described in FIG. 336 by referring to FIG. 330.

FIG. 337 illustrates the Scheduling Data SchD (FIG. 336) of user A described in FIG. 330. Referring to FIGS. 337 and 330, the subject of the present schedule is 'Meeting', the importance of the present schedule is 'B Rank', the date which the present schedule takes place is '5/1', the day which the present schedule takes place is 'Mon', the starting time of the present schedule is '8:30 AM', the ending time of the present schedule is '11:30 AM', the place where the present schedule is performed is 'Room B', and the memo which is input by user A is 'Don't forget to bring the project paper.'

FIG. 338 illustrates the Scheduling Data SchD (FIG. 336) of user A described in FIG. 330. Referring to FIGS. 338 and 330, the subject of the present schedule is 'Dinner With Mr. Green', the importance of the present schedule is 'A Rank', the date which the present schedule takes place is '5/4', the day which the present schedule takes place is 'Thur', the starting time of the present schedule is '7:00 PM', the ending time of the present schedule is '8:00 PM', the place where the present schedule is performed is 'Chinese Restaurant Chou', and the memo which is input by user A is 'Don't forget to bring the credit card.'

FIG. 339 illustrates the Scheduling Data SchD (FIG. 336) of user B described in FIG. 330. Referring to FIGS. 339 and 330, the subject of the present schedule is 'Meeting', the importance of the present schedule is 'A Rank', the date which the present schedule takes place is '5/2', the day which the present schedule takes place is 'Tue', the starting time of the present schedule is '2:00 PM', the ending time of the present schedule is '7:00 PM', the place where the present schedule is performed is 'Room B', and the memo which is input by user A is 'Re: cancellation of project B.'

FIG. 340 illustrates the Scheduling Data SchD (FIG. 336) of user C described in FIG. 330. Referring to FIGS. 340 and 330, the subject of the present schedule is 'Meeting', the importance of the present schedule is 'B Rank', the date which the present schedule takes place is '5/1', the day which the present schedule takes place is 'Mon', the starting time of the present schedule is '2:00 PM', the ending time of the present schedule is '7:00 PM', the place where the present schedule is performed is 'Room C', and the memo which is input by user A is 'Consult CPA.'

FIG. 341 illustrates a new schedule, Scheduling Data SchDc2, which is newly input by user C by utilizing Input Device 210 (FIG. 1) or via voice recognition system. The new schedule input by user C is reflected and displayed on the rest of Communication Devices 200 (i.e., the devices of users A and B in the example described in FIG. 331) by the method explained hereinafter.

FIG. 342 illustrates Scheduling Data SchD (FIG. 336) of user C described in FIG. 341. Referring to FIGS. 341 and 342, the subject of the present schedule is 'Lunch With Tom', the importance of the present schedule is 'C Rank', the date which the present schedule takes place is '5/2', the day which the present schedule takes place is 'Tue', the starting time of the present schedule is '12:00 PM', the ending time of the present schedule is '1:00 PM', the place where the present schedule is performed is 'KFC', and the memo which is input by user C is 'Meet in front of KFC.'

FIG. 343 illustrates the sequence of Communication Device 200 to update Scheduling Data SchD (FIG. 336) described in FIGS. 341 and 342 which is to be reflected and displayed on the rest of Communication Devices 200 (i.e., the devices of users A and B in the example described in FIG. 331). First, CPU 211 (FIG. 1) of Communication Device 200 owned by user C updates Scheduling Data Storage Area 20614*c* by including new scheduling data described in FIGS. 341 and 342 (S1). CPU 211 then connects to Host H (FIG. 331) via Network NT (FIG. 331) in a wireless fashion (S2), and sends Scheduling Data SchDc2 (FIG. 341) which represents the data explained in FIG. 342 (S3).

FIG. 344 illustrates the data stored in Host H (FIG. 331). As described in FIG. 344, Host H includes Users' Scheduling Data Storage Area H14*a* which is explained in details in FIG. 345 hereinafter.

FIG. 345 illustrates the information stored in Users' Scheduling Data Storage Area H14*a* (FIG. 344). Users' Scheduling Data Storage Area H14*a* stores Scheduling Data SchD (FIG. 336) of each user. In the example described in FIG. 345, Users' Scheduling Data Storage Area H14*a* stores Scheduling Data SchDa of user A, Scheduling Data SchDb of user B, and Scheduling Data SchDc of user C. Referring to FIGS. 337 through 340, Scheduling Data SchDa stores the data explained in FIGS. 337 and 338, Scheduling Data SchDb stores the data explained in FIG. 339, and Scheduling Data SchDc stores the data explained in FIG. 340.

FIG. 346 illustrates the process to update the data stored in Users' Scheduling Data Storage Area H14*a* (FIG. 345) of Host H (FIG. 331). As described in FIG. 346, Host H is connected to Communication Device 200 owned by user C via Network NT (FIG. 331) in a wireless fashion (S1). Next, Host H receives the updated scheduling data (Scheduling Data SchDc2 described in FIG. 342 in the present example), and updates Users' Scheduling Data Storage Area H14*a* accordingly (S3). After S3 is completed, the data stored in Users' Scheduling Data Storage Area H14*a* is identical to the one described in FIG. 341 which includes Scheduling Data SchDc2 of user C.

FIG. 347 illustrates the process of Host H (FIG. 331) to send the updated scheduling data to the other Communication Devices 200. First, Host H is connected in a wireless fashion via Network NT (FIG. 331) to Communication Devices 200 other than the one owned by user C (i.e., the devices owned by users A and B in the example described in FIG. 331) (S1). Host H then sends the updated scheduling data which was received in S2 of FIG. 346 (Scheduling Data SchDc2 described in FIG. 342 in the present example) (S2).

FIG. 348 illustrates the process of the rest of Communication Devices 200 (i.e., the devices owned by users A and B in the example described in FIG. 331) to update the scheduling data they store. First, Communication Devices 200 (i.e., the devices owned by users A and B in the present example) are connected in a wireless fashion via Network NT (FIG. 331) to Host H (FIG. 331) (S1). Communication devices 200 then receives the updated scheduling data which was sent in S2 of FIG. 347 (Scheduling Data SchDc2 described in FIG. 342 in the present example) (S2). CPU 211 (FIG. 1) of each Communication Device 200 updates its Scheduling Data Storage Area 20614*c* (FIG. 335) by utilizing the data received in S2 (S3).

FIG. 349 illustrates the sequence of Host H (FIG. 331) to confirm any new scheduling data to be updated. As described in FIG. 349, Host H is periodically connected to all Communication Devices 200 (the devices owned by user A, B, and C in the example described in FIG. 331) (S1) in order to check whether there are any updated scheduling data (S2). If scheduling data to be updated is found in one of Communication Devices 200 (e.g., the device owned by user C) (S3), Host H sends to the particular Communication Device 200 (e.g., the device owned by user C) an instruction indicating to send the new scheduling data to Host H (S4).

FIG. 350 illustrates the sequence of the particular Communication Device 200 (e.g., the device owned by user C) which received the instruction explained in S4 of FIG. 349. As described in FIG. 350, the particular Communication Device 200 which received the instruction from Host H (FIG. 331) as explained in S4 of FIG. 349 is connected to Host H (S1). CPU 211 (FIG. 1) of the particular Communication Device 200 then sends the updated scheduling data to Host H in a wireless fashion (S2). The explanations of FIGS. 344 through 348 apply hereinafter.

<<Batch Scheduler Updating Function—Peer-to-Peer Connection>>

The present invention can also be implemented without Users' Scheduling Data Storage Area H14*a* (FIG. 344) of Host H (FIG. 331). The details of this embodiment is explained in details hereinafter. The descriptions of FIGS. 330 through 350 apply unless stated otherwise.

Instead of Communication Device 200 accessing Host H (FIG. 331) as described in FIG. 343, each Communication Device 200 directly contacts the other Communication Devices 200 (without accessing Host H) in this embodiment as described in FIG. 351. FIG. 351 illustrates the sequence of each Communication Device 200 to update Scheduling Data SchD (FIG. 336) described in FIGS. 341 and 342 which is to be reflected and displayed on the rest of Communication Devices 200 (i.e., the devices of users A and B in the example described in FIG. 330). First, CPU 211 (FIG. 1) of Communication Device 200 owned by user C updates Scheduling Data Storage Area 20614*c* (FIG. 335) by including new scheduling data described in FIGS. 341 and 342 (S1). CPU 211 of Communication Device 200 owned by user C then connects to the rest of Communication Devices 200 (i.e., the devices of users A and B) via Network NT (FIG. 331) in a wireless fashion (S2), and sends Scheduling Data SchDc2 (FIG. 341) which represents the data explained in FIG. 342 (S3).

Instead of Host H (FIG. 331) accessing Communication Devices 200 as described in FIG. 349, each Communication Device 200 directly contacts the other Communication Devices 200 (without accessing Host H) in this embodiment as described in FIG. 352. FIG. 352 illustrates the sequence of all Communication Devices 200 (i.e., the devices of users A, B, and C in the example described in FIG. 331) to confirm any new scheduling data to be updated. As described in FIG. 352, each Communication Device 200 is periodically connected to the rest of Communication Devices 200 (S1) in order to check whether there are any updated scheduling data (S2). If there are scheduling data to be updated in any of the rest of Communication Devices 200 (S3), each Communication Device 200 retrieves the updated scheduling data therefrom.

The descriptions of FIGS. 330 through 350 are primarily emphasized on adding new scheduling data, however, the present invention is not limited thereto. Namely, the present invention is also applicable to modified scheduling data. For example, user A of Communication Device 200 modifies Scheduling Data SchDa1 described in FIG. 337 (e.g., change the 'Starting Time' from '8:30 AM' to '9:30 AM'). The description of 343 through 350 also apply herein.

<<Calculator Function>>

FIGS. 353 through 356 illustrate the calculator function of Communication Device 200. Communication Device 200 can be utilized as a calculator to perform mathematical calculation by implementing the present function.

FIG. 353 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the calculator function is activated (S3*c*) when the calculator function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 354 illustrates the data stored in RAM 206 (FIG. 1). As described in FIG. 354, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the calculator function is stored in Calculator Information Storage Area 20615*a*.

FIG. 355 illustrates the data stored in Calculator Information Storage Area 20615*a* (FIG. 354). As described in FIG. 355, Calculator Information Storage Area 20615*a* includes Calculator Software Storage Area 20615*b* and Calculator Data Storages Area 20615*c*. Calculator Software Storage Area 20615*b* stores the software programs to implement the present function, such as the one explained in FIG. 356, and Calculator Data Storage Area 20615*c* stores a plurality of data necessary to execute the software programs stored in Calculator Software Storage Area 20615*b* and to implement the present function.

FIG. 356 illustrates the software program stored in calculator storage Area 20615*b* (FIG. 355). Referring to FIG. 356, one or more of numeric data are input by utilizing Input Device 210 (FIG. 1) or via voice recognition system as well as the arithmetic operators (e.g., '+', '−', and '×'), which are temporarily stored in Calculator Data Storage Area 20615*c* (S1). By utilizing the data stored in Calculator Data Storage Area 20615*c*, CPU 211 (FIG. 1) performs the calculation by executing the software program stored in Calculator Software Storage Area 20615*b* (FIG. 355) (S2). The result of the calculation is displayed on LCD 201 (FIG. 1) thereafter (S3).

<<Spreadsheet Function>>

FIGS. 357 through 360 illustrate the spreadsheet function of Communication Device 200. Here, the spreadsheet is composed of a plurality of cells which are aligned in matrix. In other words, the spreadsheet is divided into a plurality of rows and columns in which alphanumeric data is capable to be input. Microsoft Excel is the typical example of the spreadsheet.

FIG. 357 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the spreadsheet function is activated (S3*c*) when the spreadsheet function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 358 illustrates the data stored in RAM 206 (FIG. 1). As described in FIG. 358, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the spreadsheet function is stored in Spreadsheet Information Storage Area 20616*a*.

FIG. 359 illustrates the data stored in Spreadsheet Information Storage Area 20616*a* (FIG. 358). As described in FIG. 359, Spreadsheet Information Storage Area 20616*a* includes Spreadsheet Software Storage Area 20616*b* and Spreadsheet Data Storage Area 20616*c*. Spreadsheet Software Storage Area 20616*b* stores the software programs to implement the present function, such as the one explained in FIG. 360, and Spreadsheet Data Storage Area 20616*c* stores a plurality of data necessary to execute the software programs stored in Spreadsheet Software Storage Area 20616*b* and to implement the present function.

FIG. 360 illustrates the software program stored in Spreadsheet Software Storage Area 20616*b* (FIG. 359). Referring to FIG. 360, a certain cell of a plurality of cells displayed on LCD 201 (FIG. 1) is selected by utilizing Input Device 210 (FIG. 1) or via voice recognition system. The selected cell is highlighted by a certain manner, and CPU 211 (FIG. 1) stores the location of the selected cell in Spreadsheet Data Storage Area 20616*c* (FIG. 359) (S1). One or more of alphanumeric data are input by utilizing Input Device 210 or via voice recognition system into the cell selected in S1, and CPU 211 stores the alphanumeric data in Spreadsheet Data Storage Area 20616*c* (S2). CPU 211 displays the alphanumeric data on LCD 201 thereafter (S3). The sequence of S1 through S3 can be repeated for a numerous amount of times and saved and closed thereafter.

<<Spreadsheet Function—Summary>>

The foregoing invention may be summarized as the following: A wireless communication device comprising a microphone, a speaker, an antenna, a display, an input device, a multiple mode implementer which is capable to implement a voice communication mode and a spreadsheet mode, wherein said multiple mode implementer enables said communication device to send via said antenna in a wireless fashion a series of input audio data input via said microphone and output a series of output audio data from said speaker received from said antenna in a wireless fashion when said communication device is in said voice communication mode, and said multiple mode implementer enables said communication device to display on said display a spreadsheet comprising a plurality of cells in which a cell is selected by said input device and one or more of alphanumeric data are input to said cell by said input device which are displayed on said display when said communication device is in said spreadsheet mode.

<<Word Processing Function>>

FIGS. 361 through 373 illustrate the word processing function of Communication Device 200. By way of implementing such function, Communication Device 200 can be utilized as a word processor which has the similar functions to Microsoft Words. The word processing function primarily includes the following functions: the bold formatting function, the italic formatting function, the image pasting function, the font formatting function, the spell check function, the underlining function, the page numbering function, and the bullets and numbering function. Here, the bold formatting function makes the selected alphanumeric data bold. The italic formatting function makes the selected alphanumeric data italic. The image pasting function pastes the selected image to a document to the selected location. The font formatting function changes the selected alphanumeric data to the selected font. The spell check function fixes spelling and grammatical errors of the alphanumeric data in the document. The underlining function adds underlines to the selected alphanumeric data. The page numbering function adds page numbers to each page of a document at the selected location. The bullets and numbering function adds the selected type of bullets and numbers to the selected paragraphs.

FIG. 361 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the word processing function is activated (S3*c*) when the word processing function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 362 illustrates the data stored in RAM 206 (FIG. 1). As described in FIG. 362, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the word processing function is stored in Word Processing Information Storage Area 20617*a*.

FIG. 363 illustrates the data stored in Word Processing Information Storage Area 20617*a* (FIG. 362). As described in FIG. 363, Word Processing Information Storage Area 20617*a* includes Word Processing Software Storage Area 20617*b* and Word Processing Data Storage Area 20617*c*. Word processing Software Storage Area 20617*b* stores the software programs described in FIG. 364 hereinafter, and Word Processing Data Storage Area 20617*c* stores a plurality of data described in FIG. 365 hereinafter.

FIG. 364 illustrates the software programs stored in Word Processing Software Storage Area 20617*b* (FIG. 363). As described in FIG. 364, Word Processing Software Storage Area 20617*b* stores Alphanumeric Data Input Software 20617*b*1, Bold Formatting Software 20617*b*2, Italic Formatting Software 20617*b*3, Image Pasting Software 20617*b*4, Font Formatting Software 20617*b*5, Spell Check Software 20617*b*6, Underlining Software 20617*b*7, Page Numbering Software 20617*b*8, and Bullets And Numbering Software 20617*b*9. Alphanumeric Data Input Software 20617*b*1 inputs to a document a series of alphanumeric data in accordance to the input signals produced by utilizing Input Device 210 (FIG. 1) or via voice recognition system. Bold Formatting Software 20617*b*2 implements the bold formatting function which makes the selected alphanumeric data bold of which the sequence is described in FIG. 366. Italic Formatting Software 20617*b*3 implements the italic formatting function which makes the selected alphanumeric data italic of which the sequence is described in FIG. 367. Image Pasting Software 20617*b*4 implements the image pasting function which pastes the selected image to a document to the selected location of which the sequence is described in FIG. 368. Font Formatting Software 20617*b*5 implements the font formatting function which changes the selected alphanumeric data to the selected font of which the sequence is described in FIG. 369. Spell Check Software 20617*b*6 implements the spell check function which fixes spelling and grammatical errors of the alphanumeric data in a document of which the sequence is described in FIG. 370. Underlining Software 20617*b*7 implements the underlining function which adds the selected underlines to the selected alphanumeric data of which the sequence is described in FIG. 371. Page Numbering Software 20617*b*8 implements the page numbering function which adds page numbers at the selected location to each page of a document of which the sequence is described in FIG. 372. Bullets And Numbering Software 20617*b*9 implements the bullets and numbering function which adds the selected type of bullets and numbers to the selected paragraphs of which the sequence is described in FIG. 373.

FIG. 365 illustrates the data stored in Word Processing Data Storage Area 20617*c* (FIG. 363). As described in FIG. 365, Word Processing Data Storage Area 20617*c* includes Alphanumeric Data Storage Area 20617*c*1, Bold Formatting Data Storage Area 20617*c*2, Italic Formatting Data Storage Area 20617*c*3, Image Data Storage Area 20617*c*4, Font Formatting Data Storage Area 20617*c*5, Spell Check Data Storage Area 20617*c*6, Underlining Data Storage Area 20617*c*7, Page Numbering Data Storage Area 20617*c*8, and Bullets And Numbering Data Storage Area 20617*c*9. Alphanumeric Data Storage Area 20617*c*1 stores the basic text and numeric data which are not decorated by bold and/or italic (the default font may be courier new). Bold Formatting Data Storage Area 20617*c*2 stores the text and numeric data which are decorated by bold. Italic Formatting Data Storage Area 20617*c*3 stores the text and numeric data which are decorated by italic. Image Data Storage Area 20617*c*4 stores the data representing the location of the image data pasted in a document and the image data itself. Font Formatting Data Storage Area 20617*c*5 stores a plurality of types of fonts, such as arial, century, courier new, tahoma, and times new roman, of all text and numeric data stored in Alphanumeric Data Storage Area 20617*c*1.

Spell check Data Storage Area **20617*c*6 stores a plurality of spell check data, i.e., a plurality of correct text and numeric data for purposes of being compared with the alphanumeric data input in a document and a plurality of pattern data for purposes of checking the grammatical errors therein. Underlining Data Storage Area 20617*c*7 stores a plurality of data representing underlines of different types. Page Numbering Data Storage Area 20617*c*8 stores the data representing the location of page numbers to be displayed in a document and the page number of each page of a document. Bullets And Numbering Data Storage Area 20617*c*9** stores a plurality of data representing different types of bullets and numbering and the location which they are added.

FIG. **365*a* illustrates the sequence of the software program stored in Alphanumeric Data Input Software 20617*b*1. As described in FIG. 365*a*, a plurality of alphanumeric data is input by utilizing Input Device 210 (FIG. 1) or via voice recognition system (S1). The corresponding alphanumeric data is retrieved from Alphanumeric Data Storage Area 20617*c*1 (FIG. 365) (S2), and the document including the alphanumeric data retrieved in S2 is displayed on LCD 201 (FIG. 1) (S3**).

FIG. 366 illustrates the sequence of the software program stored in Bold Formatting Software **20617*b*2. As described in FIG. 366, one or more of alphanumeric data are selected by utilizing Input Device 210 (FIG. 1) or via voice recognition system (S1). Next, a bold formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the bold formatting data from Bold Formatting Data Storage Area 20617*c*2 (FIG. 365) (S3), and replaces the alphanumeric data selected in S1 with the bold formatting data retrieved in S3 (S4). The document with the replaced bold formatting data is displayed on LCD 201 thereafter (S5**).

FIG. 367 illustrates the sequence of the software program stored in Italic Formatting Software **20617*b*3. As described in FIG. 367, one or more of alphanumeric data are selected by utilizing Input Device 210 (FIG. 1) or via voice recognition system (S1). Next, an italic formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the italic formatting data from Italic Formatting Data Storage Area 20617*c*3 (FIG. 365) (S3), and replaces the alphanumeric data selected in S1 with the italic formatting data retrieved in S3 (S4). The document with the replaced italic formatting data is displayed on LCD 201 thereafter (S5**).

FIG. 368 illustrates the sequence of the software program stored in Image Pasting Software **20617*b*4. As described in FIG. 368, the image to be pasted is selected by utilizing Input Device 210 (FIG. 1) or via voice recognition system (S1). Here, the image may be of any type, such as PEG, GIF, and TIFF. Next the location in a document where the image is to be pasted is selected by utilizing Input Device 210 or via voice recognition system (S2). The data representing the location is stored in Image Pasting Data Storage Area 20617*c*4 (FIG. 365). The image is pasted at the location selected in S2 and the image is stored in Image Pasting Data Storage Area 20617*c*4 (S3). The document with the pasted image is displayed on LCD 201 (FIG. 1) thereafter (S4**).

FIG. 369 illustrates the sequence of the software program stored in Font Formatting Software **20617*b*5. As described in FIG. 369, one or more of alphanumeric data are selected by utilizing Input Device 210 (FIG. 1) or via voice recognition system (S1). Next, a font formatting signal is input by utilizing Input Device 210 (e.g., selecting a specific icon displayed on LCD 201 (FIG. 1) or selecting a specific item from a pulldown menu) or via voice recognition system (S2). CPU 211 (FIG. 1) then retrieves the font formatting data from Italic Formatting Data Storage Area 20617*c*5 (FIG. 365) (S3), and replaces the alphanumeric data selected in S1 with the font formatting data retrieved in S3 (S4). The document with the replaced font formatting data is displayed on LCD 201 thereafter (S5**).

FIG. 370 illustrates the sequence of the software program stored in Spell Check Software **20617*b*6. As described in FIG. 370, CPU 211 (FIG. 1) scans all alphanumeric data in a document (S1). CPU 211 then compares the alphanumeric data with the spell check data stored in Spell Check Data Storage Area 20617*c*6 (FIG. 365), i.e., a plurality of correct text and numeric data for purposes of being compared with the alphanumeric data input in a document and a plurality of pattern data for purposes of checking the grammatical errors therein (S2). CPU 211 corrects the alphanumeric data and/or corrects the grammatical errors (S3), and the document with the corrected alphanumeric data is displayed on LCD 201 (FIG. 1) (S4**).

FIG. 371 illustrates the sequence of the software program stored in Underlining Software **20617*b*7. As described in FIG. 371, one or more of alphanumeric data are selected by utilizing Input Device 210 (FIG. 1) or via voice recognition system (S1). Next, an underlining signal is input by utilizing Input Device 210 (e.g., selecting a specific icon displayed on LCD 201 (FIG. 1) or selecting a specific item from a pulldown menu) or via voice recognition system to select the type of the underline to be added (S2). CPU 211 (FIG. 1) then retrieves the underlining data from Underlining Data Storage Area 20617*c*7 (FIG. 365) (S3), and adds to the alphanumeric data selected in S1 (S4). The document with underlines added to the selected alphanumeric data is displayed on LCD 201 thereafter (S5**).

FIG. 372 illustrates the sequence of the software program stored in Page Numbering Software **20617*b*8. As described in FIG. 372, a page numbering signal is input by utilizing Input Device 210 (FIG. 1) or via voice recognition system (S1). Next, the location to display the page number is selected by utilizing Input Device 210 or via voice recognition system (S2). CPU 211 (FIG. 1) then stores the location of the page number to be displayed in Page Numbering Storage Area 20617*c*8 (FIG. 365), and adds the page number to each page of a document at the selected location (S3). The document with page numbers is displayed on LCD 201 thereafter (S4**).

FIG. 373 illustrates the sequence of the software program stored in Bullets And Numbering Software **20617*b*9. As described in FIG. 373, a paragraph is selected by utilizing input device 210 (FIG. 1) or via voice recognition system (S1). Next, the type of the bullets and/or numbering is selected by utilizing Input Device 210 or via voice recognition system (S2). CPU 211 (FIG. 1) then stores the identification data of the paragraph selected in S1 and the type of the bullets and/or numbering in Bullets And Numbering Data Storage Area 20617*c*9 (FIG. 365), and adds the bullets and/or numbering to the selected paragraph of a document (S3). The document with the bullets and/or numbering is displayed on LCD 201 thereafter (S4**).

<<TV Remote Controller Function>>

FIGS. 374 through 394 illustrate the TV remote controller function which enables Communication Device 200 to be utilized as a TV remote controller.

FIG. 374 illustrates the connection between Communication Device 200 and TV 802. As described in FIG. 374, Communication Device 200 is connected in a wireless fashion to Network NT, such as the Internet, and Network NT is connected to TV 802 in a wireless fashion. Communication Device 200 may be connected to TV 802 via one or more of artificial satellites, for example, in the manner described in FIGS. 2*a*, 2*b*, and 2*c*. Communication Device 200 may also be connected to TV 802 via Sub-host as described in FIG. 75.

FIG. 375 illustrates another embodiment of connecting Communication Device 200 with TV 802. As described in FIG. 375, Communication Device 200 may directly connect to TV 802 in a wireless fashion. Here, Communication Device 200 may utilize Antenna 218 (FIG. 1) and/or LED 219 as described in FIG. 380 hereinafter to be connected with TV 802 in a wireless fashion.

FIG. 376 illustrates the connection between Communication Device 200 and TV Server TVS. As described in FIG. 376, Communication Device 200 is connected in a wireless fashion to Network NT, such as the Internet, and Network NT is connected to TV Server TVS in a wireless fashion. Communication Device 200 may be connected to TV Server TVS via one or more of artificial satellites and/or TV Server TVS may be carried by an artificial satellite, for example, in the manner described in FIGS. 2*a*, 2*b*, and 2*c*.

FIG. 377 illustrates the data stored in TV Server TVS (FIG. 376). As described in FIG. 377, TV Server TVS includes TV Program Information Storage Area H18*b* of which the details are explained in FIG. 378 hereinafter, and TV Program Listing Storage Area H18*c* of which the details are explained in FIG. 379 hereinafter.

FIG. 378 illustrates the data stored in TV Program Information Storage Area H18*b* (FIG. 377). As described in FIG. 378, TV Program Information Storage Area H18*b* includes five types of data: 'CH', 'Title', 'Sum', 'Start', 'Stop', and 'Cat'. Here, 'CH' represents the channel number of the TV programs available on TV 802 (FIG. 375); 'Title' represents the title of each TV program; 'Sum' represents the summary of each TV program; 'Start' represents the starting time of each TV program; 'Stop' represents the ending time of each TV program, and 'Cat' represents the category to which each TV program pertains.

FIG. 379 illustrates the data stored in TV Program Listing Storage Area H18*c* (FIG. 377). As described in FIG. 379, TV Program Listing Storage Area H18*c* includes four types of data: 'CH', 'Title', 'Start', and 'Stop'. Here, 'CH' represents the channel number of the TV programs available on TV 802 (FIG. 375); 'Title' represents the title of each TV program; 'Start' represents the starting time of each TV program; and 'Stop' represents the ending time of each TV program. The data stored in TV Program Listing Storage Area H18*c* are designed to be 'clipped' and to be displayed on LCD 201 (FIG. 1) of Communication Device 200 in the manner described in FIGS. 389 and 391. As another embodiment, TV Program Listing Storage Area H18*c* may be combined with TV Program Information Storage Area H18*b* (FIG. 378) and extract the data of 'CH', 'Title', 'Start', and 'Stop' therefrom.

FIG. 380 illustrates the elements of Communication Device 200. The elements of Communication Device 200 described in FIG. 380 is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to FIG. 380 in this specification.

FIG. 381 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the TV remote controller function is activated (S3*c*) when the TV remote controller function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 382 illustrates the data stored in RAM 206 (FIG. 1). As described in FIG. 382, the data to activate (as described in S3*a* of the previous figure) and to perform the communication mode is stored in Communication Data Storage Area 2061*a*, the data to activate (as described in S3*b* of the previous figure) and to perform the game download mode and the game play mode are stored in Game DL/Play Data Storage Area 2061*b*/2061*c* of which the details are described in FIG. 138, and the data to activate (as described in S3*c* of the previous figure) and to perform the TV remote controller function is stored in TV Remote Controller Information Storage Area 20618*a*.

FIG. 383 illustrates the data stored in TV Remote Controller Information Storage Area 20618*a*. As described in FIG. 383, TV Remote Controller Information Storage Area 20618*a* includes TV Remote Controller Software Storage Area 20618*b* and TV Remote Controller Data Storage Area 20618*c*. TV Remote Controller Software Storage Area 20618*b* stores a plurality of software programs to implement the present function, such as the ones described in FIGS. 386, 388, 390, 392, and 394, and TV Remote Controller Data Storage Area 20618*c* stores a plurality of data to implement the present function such as the ones described in FIG. 384 hereinafter.

FIG. 384 illustrates the data stored in TV Remote Controller Data Storage Area 20618*c* (FIG. 383). As described in FIG. 384, TV Remote Controller Data Storage Area 20618*c* includes, Channel List Data Storage Area 20618*c*1, TV Program Information Storage Area 20618*c*2, and TV Program Listing Storage Area 20618*c*3. Channel list Data Storage Area 20618*c*1 stores a list of channel numbers available on TV 802 (FIG. 375). TV Program Information Storage Area 20618*c*2 stores the data transferred from TV Program Information Storage Area H18*b* of TV Server TVS (FIG. 377). The data stored in TV Program Information Storage Area 20618*c*2 is identical to the ones stored in TV Program Information Storage Area H18*b* or may be the portion thereof. TV Program Listing Storage Area 20618*c*3 stores the data transferred from TV Program Listing Storage Area H18*c* of TV Server TVS. The data stored in TV Program Listing Storage Area 20618*c*3 is identical to the ones stored in TV Program Listing Storage Area H18*c* or may be the portion thereof.

FIG. 385 illustrates the Channel Numbers 20118*a* displayed on LCD 201 (FIG. 380). Referring to FIG. 385, ten channel numbers are displayed on LCD 201, i.e., channel numbers '1' through '10'. The highlighted Channel Number 20118*a* is the one which is currently displayed on TV 802 (FIG. 375). In the present example, channel number 20188*a* '4' is highlighted, therefore, Channel 4 is currently shown on TV 802.

FIG. 386 illustrates one of the software programs stored in TV Remote Controller Software Storage Area 20618*b* (FIG. 383) to display and select Channel Number 20118*a* (FIG. 385). As described in FIG. 386, CPU 211 (FIG. 380) displays a channel list comprising a plurality of Channel Numbers 20118*a* on LCD 201 (FIG. 380) (S1). In the example described in FIG. 384, ten channel numbers are displayed on LCD 201, i.e., channel numbers '1' through '10'. The user of Communication Device 200 inputs a channel selecting signal by utilizing Input Device 210 (FIG. 380) or via voice recognition system (S2). CPU 211 highlights the selected channel in the manner described in FIG. 385 (S3), and sends to TV 802 (FIG. 375) via LED 209 in a wireless fashion the TV channel signal (S4). The TV program of Channel 4 is displayed on TV 802 (FIG. 375) thereafter.

FIG. 387 illustrates TV Program Information 20118*c* displayed on LCD 201 (FIG. 380). Referring to FIG. 387, when the user of Communication Device 200 inputs a specific signal utilizing Input Device 210 (FIG. 380) or via voice recognition system, TV Program Information 20118*c* currently shown on Channel Number 20118*b* selected in S2 of FIG. 386 is displayed on LCD 201. TV Program Information 20118*c* includes Channel Number 20118*b*, 'Title', 'Summary', 'Start Time', 'Stop Time', and 'Category'. Here, Channel Number 20118*b* represents the channel number of the TV program currently shown on Channel Number 20118*b* (i.e., the channel number selected in S2 of FIG. 386), 'Title' represents the title of the TV program currently shown on Channel Number 20118*b*, 'Summary' represents the summary of the TV program currently shown on Channel Number 20118*b*, 'Start Time' represents the starting time of the TV program currently shown on Channel Number 20118*b*, 'Stop Time' represents the ending time of the TV program currently shown on Channel Number 20118*b*, and 'Category' represents the category to which the TV program currently shown on Channel Number 20118*b* pertains.

FIG. 388 illustrates one of the software programs stored in TV Remote Controller Software Storage Area 20618*b* (FIG. 383) which displays TV Program Information 20118*c* (FIG. 387) on LCD 201 (FIG. 380). When the user of Communication Device 200 selects the TV program information display mode by utilizing Input Device 210 (FIG. 380) or via voice recognition system (S1), CPU 211 (FIG. 380) accesses TV Server TVS (FIG. 376) and retrieves the data (i.e., 'Title', 'Summary', 'Start Time', 'Stop Time', and 'Category' described in FIG. 387) of TV program currently shown on Channel Number 20118*b* (FIG. 387) from TV Program Information Storage Area H18*b* (FIG. 378) (S2), and displays as TV Program Information 20118*c* on LCD 201 as described in FIG. 387 (S3). TV Program Information 20118*c* may be web-based.

FIG. 389 illustrates TV Program Listing 20118*d* displayed on LCD 201 (FIG. 1). In FIG. 389, 'PRn' represents a title of a TV program, and 'CHn' represents Channel Number 20118*a*. Referring to the example described in FIG. 389, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on Channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 380) is selected by way of moving the cursor displayed thereon by utilizing Input Device 210 (FIG. 380) or via voice recognition system. In the present example, the cursor is located on TV Program Pr 2.

FIG. 390 illustrates one of the software programs stored in TV Remote Controller Software Storage Area 20618*b* (FIG. 383) which displays TV Program Listing 20118*d* (FIG. 389) on LCD 201 (FIG. 380). As described in FIG. 390, when the user of Communication Device 200 selects TV program listing display mode by utilizing Input Device 210 (FIG. 380) or via voice recognition system (S1), CPU 211 (FIG. 380) accesses TV Server TVS (FIG. 376) and retrieves data (i.e., 'Title', 'Start Time', and 'Stop Time') from TV Program Listing Storage Area H18*c* (FIG. 379) (S2), and displays TV Program Listing 20118*d* (FIG. 389) on LCD 201 (S3). TV Program Listing 20118*d* may be web-based.

FIG. 391 illustrates TV Program Listing 20118*d* displayed on LCD 201 (FIG. 1) which enables to display TV Program Information 20118*c* of a selected TV program described in FIG. 393 hereinafter. In FIG. 391, 'PRn' represents a title of a TV program, and 'CHn' represents Channel Number 20118*a*. Referring to the example described in FIG. 389, TV Program Pr 1 is shown on Channel 1 and starts from 6:00 p.m. and ends at 7:00 p.m.; TV Program Pr 2 is shown on Channel 1 and starts from 7:00 p.m. and ends at 8:00 p.m.; TV Program Pr 3 is shown on Channel 1 and starts from 8:00 p.m. and ends at 9:00 p.m.; TV Program Pr 4 is shown on Channel 2 and starts from 6:00 p.m. and ends at 8:00 p.m.; TV Program Pr 5 is shown on channel 2 and starts from 8:00 p.m. and ends at 9:00 p.m.; TV Program Pr 6 is shown on Channel 3 and starts from 6:00 p.m. and ends at 7:00 p.m.; and TV Program Pr 7 is shown on Channel 3 and starts from 7:00 p.m. and ends at 9:00 p.m. The TV program displayed on LCD 201 (FIG. 1) is selected by way of utilizing the cursor displayed thereon. The cursor can be moved from one TV program to another one by utilizing Input Device 210 (FIG. 380) or via voice recognition system. In the present example, the cursor located on Pr 2 (as described in FIG. 389) is moved to Pr4.

FIG. 392 illustrates the sequence of displaying TV Program Information 20118*c* (FIG. 393) from TV Program Listing 20118*d* (FIG. 391). First, CPU 211 (FIG. 380) displays TV Program Listing 20118*d* (FIG. 391) on LCD 201 (FIG. 380) (S1). Next, the user of Communication Device 200 selects one of the TV programs listed in TV Program Listing 20118*d* by moving the cursor displayed on LCD 201 (S2). CPU 211 sends via Antenna 218 (FIG. 380) to TV Server TVS (FIG. 376) a TV program information request signal indicating TV Server TVS to send TV Program Information 20118*c* of the selected TV program (S3). CPU 211 retrieves TV Program Information 20118*c* from TV Server TVS via Antenna 218 (S4), and displays on LCD 201 thereafter as described in FIG. 393 (S5).

FIG. 393 illustrates TV Program Information 20118*c* displayed on LCD 201 (FIG. 380) which is retrieved in S4 of FIG. 392 hereinbefore. Referring to FIG. 393, TV Program Information 20118c includes Channel Number 20118b, 'Title', 'Summary', 'Start Time', 'Stop Time', and 'Category'. Here, Channel Number 20118b represents the channel number of the TV program selected in S2 of FIG. 392, 'Title' represents the title of the TV program selected in S2 of FIG. 392, 'Summary' represents the summary of the TV program selected in S2 of FIG. 392, 'Start Time' represents the starting time of the TV program selected in S2 of FIG. 392, 'Stop Time' represents the ending time of the TV program selected in S2 of FIG. 392, and 'Category' represents the category to which the TV program selected in S2 of FIG. 392 pertains.

FIG. 394 illustrates another embodiment of the method to display Channel Number 20118a. Instead of displaying all the available Channel Numbers 20118a as described in FIG. 385, only Channel Number 20118a currently shown on TV 802 (FIG. 375) may be displayed on LCD 201 (FIG. 380), Channel Number 20118a '4' in the present example.

<<CD/PC Inter-Communicating Function>>

FIGS. 413 through 427 illustrate the Communication Device 200/personal computer inter-communicating function (the CD/PC inter-communicating function) which enables Communication Device 200 to transfer LED transferable data (i.e., data transferable via LED 219 (FIG. 380)) to personal computers in a wireless fashion.

FIG. 413 illustrates the connection between Communication Device 200 and Personal Computer PC. As described in FIG. 413, Communication Device 200 is connected in a wireless fashion to Network NT, such as the Internet, and Network NT is connected to Personal Computer PC in a wireless fashion. Communication Device 200 may be connected to Personal Computer PC via one or more of artificial satellites, for example, in the manner described in FIGS. 2a, 2b, and 2c. Communication Device 200 may also be connected to Personal Computer PC via sub-host in the manner described in FIG. 75.

FIG. 414 illustrates another embodiment of connecting Communication Device 200 with Personal Computer PC. As described in FIG. 414, Communication Device 200 may directly connect to Personal Computer PC in a wireless fashion. Here, Communication Device 200 may utilize Antenna 218 (FIG. 1) and/or LED 219 as described in FIG. 380 hereinafter to be connected with Personal Computer PC in a wireless fashion.

FIG. 415 illustrates the software program installed in each Communication Device 200 to initiate the present function. First of all, a list of modes is displayed on LCD 201 (FIG. 1) (S1). When an input signal is input by utilizing Input Device 210 (FIG. 1) or via voice recognition system to select a specific mode (S2), the selected mode is activated. In the present example, the communication mode is activated (S3a) when the communication mode is selected in the previous step, the game download mode and the game play mode are activated (S3b) when the game download mode and the game play mode are selected in the previous step of which the details are described in FIG. 137, and the CD/PC inter-communicating function is activated (S3c) when the CD/PC inter-communicating function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 416 illustrates the data stored in RAM 206 (FIG. 1). As described in FIG. 416, the data to activate (as described in S3a of the previous figure) and to perform the communication mode is stored in Communication Data Storage Area 2061a, the data to activate (as described in S3b of the previous figure) and to perform the game download mode and the game play mode are stored in Game DL/Play Data Storage Area 2061b/2061c of which the details are described in FIG. 138, and the data to activate (as described in S3c of the previous figure) and to perform the CD/PC inter-communicating function is stored in CD/PC Inter-communication Information Storage Area 20619a.

FIG. 417 illustrates the data stored in CD/PC Inter-communication Information Storage Area 20619a. As described in FIG. 417, CD/PC Inter-communication Information Storage Area 20619a includes CD/PC Inter-communication Software Storage Area 20619b and CD/PC inter-Communication Data Storage Area 20619c. CD/PC Inter-communication Software Storage Area 20619b stores a plurality of software programs to implement the present function, such as the ones described in FIGS. 419 and 420, and CD/PC Inter-communication Data Storage Area 20619c stores a plurality of data to implement the present function such as the one described in FIG. 418 hereinafter.

FIG. 418 illustrates the data stored in CD/PC Inter-communication Data Storage Area 20619c. As described in FIG. 418, CD/PC Inter-communication Data Storage Area 20619c includes LED Transferable Data Index Storage Area 20619c1, Selected LED Transferable Data Index Storage Area 20619c2, Received LED Transferable Data Storage Area 20619c3, and Non-LED Transferable Data Index Storage Area 20619c4. Here, LED Transferable Data Index Storage Area 20619c1 stores a plurality of LED transferable data indexes, i.e., unique information assigned to each LED transferable data as an identifier (e.g., a title of the data), Selected LED Transferable Data Index Storage Area 20619c2 stores one of the LED transferable data indexes stored in LED Transferable Data Index Storage Area 20619c1 which is selected by the user of Communication Device 200 by utilizing Input Device 210 (FIG. 1) or via voice recognition system, Received LED Transferable Data Storage Area 20619c3 stores a plurality of LED transferable data received from Personal Computer PC (FIGS. 413 and/or 414), and Non-LED Transferable Data Index Storage Area 20619c4 stores the data which are not transferable in a wireless fashion via LED 219 (FIG. 380).

FIG. 419 illustrates the sequence of the software program stored in CD/PC Inter-communication Software Storage Area 20619b (FIG. 417) to send the LED transferable data to Personal Computer PC (FIGS. 413 and/or 414). Referring to FIG. 419, CPU 211 (FIG. 1) displays a list of LED transferable data on LCD 201 (FIG. 1) by retrieving LED transferable data index from LED Transferable Data Index Storage Area 20619c1 (FIG. 418) (S1). The user of Communication Device 200 selects one of the LED transferable data from the list by utilizing Input Device 210 (FIG. 1) or via voice recognition system, and CPU 211 stores the LED transferable data index of the selected LED transferable data in Selected LED Transferable Data Index Storage Area 20619c2 (FIG. 418) (S2). CPU 211 then retrieves the LED transferable data corresponding to the LED transferable data index from RAM 206 (FIG. 1) (S3), and transfers to Personal Computer PC (FIGS. 413 and/or 414) via LED 219 (FIG. 1) in a wireless fashion (S4).

FIG. 420 illustrates the sequence of the software program stored in CD/PC Inter-communication Software Storage Area 20619b (FIG. 417) to receive the LED transferable data from Personal Computer PC (FIGS. 413 and/or 414) via LED 219 (FIG. 380). Referring to FIG. 420, CPU 211 (FIG. 1) selects a storage area in Received LED Transferable Data Storage Area 20619*c*3 (FIG. 418) to store the received LED transferable data. Selecting a storage area may be automatically performed by CPU 211 or by the user of Communication Device 200 by utilizing Input Device 210 (FIG. 1) or via voice recognition system (S1). Next CPU 211 receives the LED transferable data from Personal Computer PC (S2), and stores it to the selected storage area identified in S1 (S3). CPU 211 displays the LED transferable data index of the stored LED transferable data on LCD 201 (FIG. 1) thereafter (S4).

FIG. 421 illustrates another embodiment of the data stored in CD/PC Inter-communication Data Storage Area 20619*c*. As described in FIG. 421, CD/PC Inter-communication Data Storage Area 20619*c* includes LED Transferable Data Storage Area 20619*c*5, Selected LED Transferable Data Storage Area 20619*c*6, Received LED Transferable Data Storage Area 20619*c*7, and Non-LED Transferable Data Storage Area 20619*c*8. Here, LED Transferable Data Storage Area 20619*c*5 stores a plurality of LED transferable data itself (instead of storing LED transferable data index), Selected LED Transferable Data Storage Area 20619*c*6 stores one of the LED transferable data stored in LED Transferable Data Storage Area 20619*c*5 which is selected by the user of Communication Device 200 by utilizing Input Device 210 (FIG. 1) or via voice recognition system, Received LED Transferable Data Storage Area 20619*c*7, which is identical to Received LED Transferable Data Storage Area 20619*c*7 (FIG. 418), stores a plurality of LED transferable data received from Personal Computer PC (FIGS. 413 and/or 414), and Non-LED Transferable Data Storage Area 20619*c*8 stores the data which are not transferable in a wireless fashion via LED 219 (FIG. 380).

FIGS. 422 through 427 illustrate the data and software programs stored in Personal Computer PC (FIGS. 413 and/or 414).

FIG. 422 illustrates the data stored in RAM (or hard disk) of Personal Computer PC (FIGS. 413 and/or 414) which is not described in drawing figure. As described in FIG. 422, the data to activate and to perform the CD/PC inter-communicating function is stored in PC/CD Inter-communication Information Storage Area PC19*a*.

FIG. 423 illustrates the data stored in PC/CD Inter-communication Information Storage Area PC19*a*. As described in FIG. 423, PC/CD Inter-communication Information Storage Area PC19*a* includes PC/CD Inter-communication Software Storage Area PC19*b* and PC/CD Inter-communication Data Storage Area PC19*c*. PC/CD Inter-communication Software Storage Area PC19*b* stores a plurlaity of software programs to implement the present function, such as the ones described in FIGS. 425 and 426, and PC/CD Inter-communication Data Storage Area PC19*c* stores a plurality of data to implement the present function such as the one described in FIG. 424 hereinafter.

FIG. 424 illustrates the data stored in PC/CD Inter-Communication Data Storage Area PC19*c*. As described in FIG. 424, PC/CD Inter-communication Data Storage Area PC19*c* includes LED Transferable Data Index Storage Area PC19*c*1, Selected LED Transferable Data Index Storage Area PC19*c*2, Received LED Transferable Data Storage Area PC19*c*3, and Non-LED Transferable Data Index Storage Area PC19*c*4. Here, LED Transferable Data Index Storage Area PC19*c*1 stores a plurality of LED transferable data indexes, i.e., unique information assigned to each LED transferable data as an identifier (e.g., title of the data), Selected LED Transferable Data Index Storage Area PC19*c*2 stores one of the LED transferable data indexes stored in LED Transferable Data Index Storage Area PC19*c*1 which is selected by the user of Personal Computer PC (FIGS. 413 and/or 414) by utilizing input device (e.g., keyboard, mouse, and joystick), Received LED Transferable Data Storage Area PC19*c*3 stores a plurality of LED transferable data received from Communication Device 200, and Non-LED Transferable Data Index Storage Area PC19*c*4 stores the data which are not transferable in a wireless fashion via LED communication device installed in Personal Computer PC.

FIG. 425 illustrates the sequence of the software program stored in PC/CD Inter-communication Software Storage Area PC19*b* (FIG. 423) to send the LED transferable data to Communication Device 200. Referring to FIG. 425, the CPU of Personal Computer PC displays a list of LED transferable data on its monitor by retrieving LED transferable data index from LED Transferable Data Index Storage Area PC19*c*1 (FIG. 424) (S1). The user of Personal Computer PC (FIGS. 413 and/or 414) selects one of the LED transferable data from the list by utilizing input device (e.g., keyboard, mouse, and joystick), and the CPU of Personal Computer PC stores the LED transferable data index of the selected LED transferable data in Selected LED Transferable Data Index Storage Area PC19*c*2 (FIG. 424) (S2). The CPU of Personal Computer PC then retrieves the LED transferable data corresponding to the LED transferable data index from RAM of Personal Computer PC (S3), and transfers to Communication Device 200 via LED communication device in a wireless fashion (S4).

FIG. 426 illustrates the sequence of the software program stored in PC/CD Inter-communication Software Storage Area PC19*b* (FIG. 423) to receive the LED transferable data from Communication Device 200 via LED communication device. Referring to FIG. 426, the CPU of Personal Computer PC selects a storage area in Received LED Transferable Data Storage Area PC19*c*3 (FIG. 424) to store the received LED transferable data. Selecting a storage area may be automatically performed by the CPU of Personal Computer PC or by its user by utilizing input device (e.g., keyboard, mouse, and joystick) (S1). Next the CPU of Personal Computer PC receives the LED transferable data from Communication Device 200 (S2), and stores it to the selected storage area identified in S1 (S3). The CPU of Personal Computer PC displays the LED transferable data index of the stored LED transferable data on its monitor thereafter (S4).

FIG. 427 illustrates another embodiment of the data stored in PC/CD Inter-communication Data Storage Area PC19*c*. As described in FIG. 427, PC/CD Inter-communication Data Storage Area PC19*c* includes LED Transferable Data Storage Area PC19*c*5, Selected LED Transferable Data Storage Area PC19*c*6, Received LED Transferable Data Storage Area PC19*c*7, and Non-LED Transferable Data Storage Area PC19*c*8. Here, LED Transferable Data Storage Area PC19*c*5 stores a plurality of LED transferable data itself (instead of storing LED transferable data index), Selected LED Transferable Data Storage Area PC19*c*6 stores one of the LED transferable data stored in LED Transferable Data Storage Area PC19*c*5 which is selected by the user of Personal Computer PC by utilizing input device (e.g., keyboard, mouse, and/or joystick), Received LED Transferable Data Storage Area PC19*c*7, which is identical to Received LED Transferable Data Storage Area PC19*c*7 (FIG. 418), stores a plurality of LED transferable data received from Communication Device 200, and Non-LED Transferable Data Storage Area PC19*c*8 stores the data which are not transferable in a wireless fashion via LED communication device.

As another embodiment, Antenna 218 (FIG. 1) may be utilized instead of LED 219 (FIG. 380) to send and receive LED transferable data. As another embodiment, the present function may be implemented between two Communication Devices 200 utilizing either Antenna 218 or LED 219. As another embodiment, the present function may be implemented between two personal computers PC utilizing either antenna or LED communication device.

<<CD/PC Inter-Communicating Function—Summary>>

The foregoing inventions may be summarized as the following.

(1) A software program installed in a communication device which enables said communication device to transfer a plurality of LED transferable data to a personal computer in a wireless fashion, said communication device comprises an LED wireless communicator, a display, an input device, wherein a list of a plurality of LED transferable data is displayed on said display, a selected LED transferable data is selected by the operation of said input device, and said selected LED transferable data is transferred to said personal computer via said LED wireless communicator.

(2) Said communication device in (1) further comprises a storage area comprising a LED Transferable Data Storage Area and a Non-LED Transferable Data Storage Area, wherein said LED Transferable Data Storage Area stores a plurality of said LED transferable data which are capable to be transferred via said LED wireless communicator, and said Non-LED Transferable Data Storage Area stores a plurality of said non-LED transferable data which are not capable to be transferred via said LED wireless communicator.

(3) A 1st communication device which is capable to transfer a plurality of LED transferable data to a personal computer (or a 2nd communication device) in a wireless fashion, said 1st communication device (and/or said 2nd communication device) comprises an LED wireless communicator, a display, an input device, a microphone, a speaker, said 1st communication device (and/or said 2nd communication device) is capable to implement a CD/PC inter-communication mode and a voice communication mode, wherein a list of a plurality of LED transferable data is displayed on said display, a selected LED transferable data is selected by the operation of said input device, and said selected LED transferable data is transferred to said personal computer (or said 2nd communication device) via said LED wireless communicator when said communication device is in said CD/PC inter-communication mode, and a plurality of aural data are input to and out from said microphone and said speaker when said 1st communication device is in said voice communication mode.

(4) Said 1st communication device in (3) further comprises a mode activator which activates said CD/PC inter-communication mode and/or said voice communication mode.

<<PDWR Sound Selecting Function>>

FIGS. 428 through 456 illustrate the pre-dialing/dialing/waiting sound Selecting Function (PDWR Sound Selecting Function) which enables Communication Device 200 to generate the pre-dialing sound, dialing sound, and waiting sound selected by the user thereof.

FIG. 428 illustrates the overall sequence of Communication Device 200 to generate the pre-dialing sound, dialing sound, and waiting sound. These sounds are generated when Communication Device 200 is in voice communication mode. Referring to FIG. 428, the user of Communication Device 200 selects the voice communication mode by utilizing Input Device 210 (FIG. 1) or via voice recognition system (S1). Communication Device 200 outputs the pre-dialing sound via Speaker 216 (FIG. 1) when the voice recognition system is activated and until the dialing process is initiated (S2). Next, Communication Device 200 outputs the dialing sound via Speaker 216 during the dialing process, i.e., when the user of Communication Device 200 is inputting a phone number by utilizing Input Device 210 or via voice recognition system (S3). Once the dialing process is completed, Communication Device 200 outputs the waiting sound via Speaker 216 (S4), until the line is connected at the other end and a voice communication is initiated (S5).

FIG. 429 illustrates the data stored in Host H. As described in FIG. 429, Host H includes Host Information Storage Area H00*a* which stores various types of data to assist and/or cooperate with Communication Device 200 to implement all modes, functions, and systems described in this specification, including data explained in FIG. 430 hereinafter. As another embodiment, Host H may be composed of a plurality of computers, i.e., one master computer and a plurality of slave computers, wherein the master computer is connected to the plurality of slave computers. As another embodiment, Host H may also be composed of a plurlaity of master computers by way of utilizing peer-to-peer connection.

FIG. 430 illustrates the data stored in Host Information Storage Area H00*a* described in FIG. 429. As described in FIG. 430, Host Information Storage Area H00*a* includes Host Software Storage Area H00*b* and Host Data Storage Area H00*c*. Here, Host Software Storage Area H00*b* stores all software programs necessary to implement the present function including the one illustrated in FIG. 431 hereinafter. Host Data Storage Area H00*c* stores all data necessary to implement the present function including the one illustrated in FIG. 434 hereinafter.

FIG. 431 illustrates the software programs stored in Host Software Storage Area H00*b* (FIG. 430). As described in FIG. 431, Host Software Storage Area H00*b* includes Com Device/Host Data Transfering Software Storage Area H00*b*1 and Host/Com Device Data Transfering Software Storage Area H00*b*2. Com Device/Host Data Transfering Software Storage Area H00*b*1 stores the software programs utilized when Host H (FIG. 429) recieves data from Communication Device 200. Host/Com Device Data Transfering Software Storage Area H00*b*2 stores the software programs utilized when Host H sends data to Communiction Device 200.

FIG. 432 illustrates the sequence of the software program stored in Com Device/Host Data Transfering Software Storage Area H00*b*1 (FIG. 431). Taking a download request for example, Communication Device 200, first of all, sends a download request to Host H (FIG. 429) to download a specific data therefrom (S1). Next, Host H activates the software program stored in Com Device/Host Data Transfering Software Storage Area H00*b*1 to receive the download request from Communication Device 200 (S2).

FIG. 433 illustrates the sequence of the software program stored in Host/Com Device Data Transfering Software Storage Area H00*b*2 (FIG. 431). Taking the download request for example, Host H (FIG. 429), first of all, activates the software program stored in Host/Com Device Data Transfering Software Storage Area H00*b*2, which selects the data stored in Host Data Storage Area H00*c* (FIG. 430) specified in the download request (S1). Host H, under the command of the software program stored in Host/Com Device Data Transfering Software Storage Area H00*b*2, sends the data selected in S1 to Communication Device 200 (S2).

FIG. 434 illustrates the storage area included in Host Data Storage Area H00*c* (FIG. 430). As described in FIG. 434, Host Data Storage Area H00*c* includes PDWR Sound Selection Information Storage Area H20*a* which stores various types of sound data and software programs to implement the present function of which the information stored therein is explained in FIG. 435 hereinafter.

FIG. 435 illustrates the storage area included in PDWR Sound Selection Information Storage Area H20*a* (FIG. 434). As described in FIG. 435, PDWR Sound Selection Information Storage Area H20*a* includes PDWR Sound Selection Software Storage Area H20*b* and PDWR Sound Selection Data Storage Area H20*c*. Here, PDWR Sound Selection Software Storage Area H20*b* stores the software programs which are downloaded and utilized by Communication Device 200 such as the ones explained in FIGS. 432 and 433 hereinbefore. PDWR Sound Selection Data Storage Area H20*c* stores a plurality of sound data, such as the ones explained in FIGS. 436 through 440.

FIG. 436 illustrates the storage area included in PDWR Sound Selection Data Storage Area H20*c* (FIG. 435). As described in FIG. 436, PDWR Sound Selection Data Storage Area H20*c* includes Pre-dialing Sound Data Storage Area H20*c*1, Dialing Sound Data Storage Area H20*c*2, Waiting Sound Data Storage Area H20*c*3, and Ringing Sound Data Storage Area H20*c*4. Here, Pre-dialing Sound Data Storage Area H20*c*1 stores a plurality of sound data explained in FIG. 437, Dialing Sound Data Storage Area H20*c*2 stores a plurality of sound data explained in FIG. 438, Waiting Sound Data Storage Area H20*c*3 stores a plurality of sound data explained in FIG. 439, and Ringing Sound Data Storage Area H20*c*4 stores a plurality of sound data explained in FIG. 440.

FIG. 437 illustrates the data stored in Pre-dialing Sound Data Storage Area H20*c*1 (FIG. 436). As described in FIG. 437, Pre-dialing Sound Data Storage Area H20*c*1 stores Pre-dialing Sound Data H20*c*1*a*, Pre-dialing Sound Data H20*c*1*b*, and Pre-dialing Sound Data H20*c*1*c*. In the present embodiment, Pre-dialing Sound Data H20*c*1*a* is a beeping sound, Pre-dialing Sound Data H20*c*1*b* is a tone sound, and Pre-dialing Sound Data H20*c*1*c* is a voice data of an actress. As another embodiment, a music melody, a hunk sound of an automobile, and a sound of siren may also be utilized instead. Various types of sound format may be utilized, including WAV format, and/or MP3 format.

FIG. 438 illustrates the data stored in Dialing Sound Data Storage Area H20*c*2 (FIG. 436). As described in FIG. 438, Dialing Sound Data Storage Area H20*c*2 stores Dialing Sound Data H20*c*2*a*, Dialing Sound Data H20*c*2*b*, and Dialing Sound Data H20*c*2*c*. In the present embodiment, Dialing Sound Data H20*c*2*a* is a beeping sound, Dialing Sound Data H20*c*2*b* is a tone sound, and Dialing Sound Data H20*c*2*c* is a voice data of an actress. As another embodiment, a music melody, a hunk sound of an automobile, and a sound of siren may also be utilized instead. Various types of sound format may be utilized, including WAV format, and/or MP3 format.

FIG. 439 illustrates the data stored in Waiting Sound Data Storage Area H20*c*3 (FIG. 436). As described in FIG. 439, Waiting Sound Data Storage Area H20*c*3 stores Waiting Sound Data H20*c*3*a*, Waiting Sound Data H20*c*3*b*, and Waiting Sound Data H20*c*3*c*. In the present embodiment, Waiting Sound Data H20*c*3*a* is a beeping sound, Waiting Sound Data H20*c*3*b* is a tone sound, and Waiting Sound Data H20*c*3*c* is a voice data of an actress. As another embodiment, a music melody, a hunk sound of an automobile, and a sound of siren may also be utilized instead. Various types of sound format may be utilized, including WAV format, and/or MP3 format.

FIG. 440 illustrates the data stored in Ringing Sound Data Storage Area H20*c*4 (FIG. 436). As described in FIG. 440, Ringing Sound Data Storage Area H20*c*4 stores Ringing Sound Data H20*c*4*a*, Ringing Sound Data H20*c*4*b*, and Ringing Sound Data H20*c*4*c*. In the present embodiment, Ringing Sound Data H20*c*4*a* is a beeping sound, Ringing Sound Data H20*c*4*b* is a tone sound, and Ringing Sound Data H20*c*4*c* is a voice data of an actress. As another embodiment, a music melody, a hunk sound of an automobile, and a sound of siren may also be utilized instead. Various types of sound format may be utilized, including WAV format, and/or MP3 format.

FIG. 441 illustrates the software program installed in Communication Device 200 to initiate the present function. First of all, a list of modes is displayed on LCD 201 (FIG. 1) (S1). When an input signal is input from Input Device 210 (FIG. 1) to select a specific mode (S2), the selected mode is activated. In the present example, the communication mode is activated (S3*a*) when the communication mode is selected in the previous step, the game download mode and the game play mode are activated (S3*b*) when the game download mode and the game play mode are selected in the previous step of which the details are described in FIG. 137, and the PDWR Sound Selecting Function is activated (S3*c*) when the PDWR Sound Selecting Function is selected in the previous step. The modes displayed on LCD 201 in S1 which are selectable in S2 and S3 may include all functions and modes explained in this specification. Once the selected mode is activated, another mode can be activated while the first activated mode is still implemented by going through the steps of S1 through S3 for another mode, thereby enabling a plurality of functions and modes being performed simultaneously (S4).

FIG. 442 illustrates the data stored in RAM 206 (FIG. 1). As described in FIG. 442, the data to activate (as described in S3*a* of the previous figure) and to perform the communication mode is stored in communication data storage area 2061*a*, the data to activate (as described in S3*b* of the previous figure) and to perform the game download mode and the game play mode are stored in game DL/play data storage area 2061*b*/2061*c* of which the details are described in FIG. 138, and the data to activate (as described in S3*c* of the previous figure) and to perform the PDWR Sound Selecting Function is stored in PDWR Sound Selection Information Storage Area 20620*a*.

FIG. 443 illustrates the storage area included in PDWR Sound Selection Information Storage Area 20620*a* (FIG. 442). As described in FIG. 443, PDWR Sound Selection Information Storage Area 20620*a* includes PDWR Sound Selection Software Storage Area 20620*b*, PDWR Sound Selection Data Storage Area 20620*c*, and PDWR Sound Data Index Storage Area 20620*d*. Here, PDWR Sound Selection Software Storage Area 20620*b* stores the software programs which are downloaded and utilized by Communication Device 200 of which the details are explained hereinafter. PDWR Sound Selection Data Storage Area 20620*c* stores a plurality of sound data explained in FIGS. 444 through 448. PDWR Sound Data Index Storage Area 20620*d* stores sound data indexes which are identifiers of sound data selected in S2 through S4 of FIG. 454 hereinafter.

FIG. 444 illustrates the storage area included in PDWR Sound Selection Data Storage Area 20620*c* (FIG. 443). As described in FIG. 444, PDWR Sound Selection Data Storage Area 20620*c* includes Pre-dialing Sound Data Storage Area 20620*c*1, Dialing Sound Data Storage Area 20620*c*2, Waiting Sound Data Storage Area 20620*c*3, and Ringing Sound Data Storage Area 20620*c*4. Here, Pre-dialing Sound Data Storage Area 20620*c*1 stores a plurality of sound data explained in FIG. 445, Dialing Sound Data Storage Area 20620*c*2 stores a plurality of sound data explained in FIG. 446, Waiting Sound Data Storage Area 20620*c*3 stores a plurality of sound data explained in FIG. 447, and Ringing Sound Data Storage Area 20620*c*4 stores a plurality of sound data explained in FIG. 448.

FIG. 445 illustrates the data stored in Pre-dialing Sound Data Storage Area 20620*c*1 (FIG. 444). As described in FIG. 445, Pre-dialing Sound Data Storage Area 20620*c*1 stores Pre-dialing Sound Data 20620*c*1*a*, Pre-dialing Sound Data 20620*c*1*b*, and Pre-dialing Sound Data 20620*c*1*c*. In the present embodiment, Pre-dialing Sound Data 20620*c*1*a* is a beeping sound, Pre-dialing Sound Data 20620*c*1*b* is a tone sound, and Pre-dialing Sound Data 20620*c*1*c* is a voice data of an actress. As another embodiment, a music melody, a hunk sound of an automobile, and a sound of siren may also be utilized instead. In addition, a voice data of the user of Communication Device 200 or a voice data of his/her friend recorded via microphone (FIG. 215) may be utilized. Various types of sound format may be utilized, including WAV format, and/or MP3 format.

FIG. 446 illustrates the data stored in Dialing Sound Data Storage Area **20620*c*2 (FIG. 444). As described in FIG. 446, Dialing Sound Data Storage Area 20620*c*2 stores Dialing Sound Data 20620*c*2*a*, Dialing Sound Data 20620*c*2*b*, and Dialing Sound Data 20620*c*2*c*. In the present embodiment, Dialing Sound Data 20620*c*2*a* is a beeping sound, Dialing Sound Data 20620*c*2*b* is a tone sound, and Dialing Sound Data 20620*c*2*c* is a voice data of an actress. As another embodiment, a music melody, a hunk sound of an automobile, and a sound of siren may also be utilized instead. In addition, a voice data of the user of Communication Device 200 or a voice data of his/her friend recorded via microphone (FIG. 215**) may be utilized. Various types of sound format may be utilized, including WAV format, and/or MP3 format.

FIG. 447 illustrates the data stored in Waiting Sound Data Storage Area **20620*c*3 (FIG. 444). As described in FIG. 447, Waiting Sound Data Storage Area 20620*c*3 stores Waiting Sound Data 20620*c*3*a*, Waiting Sound Data 20620*c*3*b*, and Waiting Sound Data 20620*c*3*c*. In the present embodiment, Waiting Sound Data 20620*c*3*a* is a beeping sound, Waiting Sound Data 20620*c*3*b* is a tone sound, and Waiting Sound Data 20620*c*3*c* is a voice data of an actress. As another embodiment, a music melody, a hunk sound of an automobile, and a sound of siren may also be utilized instead. In addition, a voice data of the user of Communication Device 200 or a voice data of his/her friend recorded via microphone (FIG. 215**) may be utilized. Various types of sound format may be utilized, including WAV format, and/or MP3 format.

FIG. 448 illustrates the data stored in Ringing Sound Data Storage Area **20620*c*4 (FIG. 444). As described in FIG. 448, Ringing Sound Data Storage Area 20620*c*4 stores Ringing Sound Data 20620*c*4*a*, Ringing Sound Data 20620*c*4*b*, and Ringing Sound Data 20620*c*4*c*. In the present embodiment, Ringing Sound Data 20620*c*4*a* is a beeping sound, Ringing Sound Data 20620*c*4*b* is a tone sound, and Ringing Sound Data 20620*c*4*c* is a voice data of an actress. As another embodiment, a music melody, a hunk sound of an automobile, and a sound of siren may also be utilized instead. In addition, a voice data of the user of Communication Device 200 or a voice data of his/her friend recorded via microphone (FIG. 215**) may be utilized. Various types of sound format may be utilized, including WAV format, and/or MP3 format.

FIG. 449 illustrates the sequence of the software program stored in PDWR Sound Selection Software Storage Area H**20*b* (FIG. 435). Referring to FIG. 449, CPU 211 (FIG. 1) displays on LCD 201 (FIG. 1) a list of sound data downloadable from Host H (FIG. 429) in categories (i.e., pre-dialing sound data, dialing sound data, waiting sound data, and ringing sound data) (S1). Next, the user of Communication Device 200 selects by utilizing Input Device 210 (FIG. 1) or via voice recognition system one of the sound data to be downloaded (S2). CPU 211 selects one of the storage areas in PDWR Sound Selection Data Storage Area 20620*c* (FIG. 443) (S3), and CPU 211 stores the downloaded sound data therein (S4). For example, if the selected sound data is a pre-dialing sound data, the downloaded sound data is stored in Pre-dialing Sound Data Storage Area 20620*c*1 (FIG. 445). If the selected sound data is a dialing sound data, the downloaded sound data is stored in Dialing Sound Data Storage Area 20620*c*2 (FIG. 446). If the selected sound data is a waiting sound data, the downloaded sound data is stored in Waiting Sound Data Storage Area 20620*c*3 (FIG. 447). If the selected sound data is a ringing sound data, the downloaded sound data is stored in Ringing Sound Data Storage Area 20620*c*4 (FIG. 448**).

FIG. 450 illustrates the list of sound data downloadable from Host H (FIG. 429) displayed on LCD 201 (FIG. 1) described in S1 of FIG. 449 hereinbefore. As described in FIG. 450, a list of sound data downloadable from Host H (FIG. 429) is displayed on LCD 201 in categories (i.e., pre-dialing sound data, dialing sound data, waiting sound data, and ringing sound data). The mark x illustrates that the corresponding sound data is already installed in PDWR Sound Selection Data Storage Area **20620*c* (FIG. 443). In the example described in FIG. 450, Pre-dialing Sound Data H20*c*1*a* and Pre-dialing Sound Data H20*c*1*b* stored in Pre-dialing Sound Data Storage Area H20*c*1 (FIG. 437), Dialing Sound Data H20*c*2*a* and Dialing Sound Data H20*c*2*b* stored in Dialing Sound Data Storage Area H20*c*2 (FIG. 438), Waiting Sound Data H20*c*3*a* and Waiting Sound Data H20*c*3*b* stored in Waiting Sound Data Storage Area H20*c*3 (FIG. 439), and Ringing Sound Data H20*c*4*a* and Ringing Sound Data H20*c*4*b* stored in Ringing Sound Data Storage Area H20*c*4 (FIG. 440) are already downloaded and stored in PDWR Sound Selection Data Storage Area 20620*c***.

FIG. 451 illustrates the list of sound data displayed on LCD 201 (FIG. 1) after being selected as described in S2 of FIG. 449 hereinbefore. Referring to FIG. 451, the user of Communication Device 200 selects by utilizing Input Device 210 (FIG. 1) or via voice recognition system the sound data to be downloaded. The selected sound data are marked as DL as described in FIG. 451. In the example described in FIG. 450, Pre-dialing Sound Data H**20*c*1*c* stored in Pre-dialing Sound Data Storage Area H20*c*1 (FIG. 437), Dialing Sound Data H20*c*2*c* stored in Dialing Sound Data Storage Area H20*c*2 (FIG. 438), Waiting Sound Data H20*c*3*c* stored in Waiting Sound Data Storage Area H20*c*3 (FIG. 439), and Ringing Sound Data H20*c*4*c* stored in Ringing Sound Data Storage Area H20*c*4 (FIG. 440) are selected in S2 of FIG. 449 to be downloaded. As a result, all sound data stored in PDWR Sound Selection Data Storage Area H20*c*, Pre-dialing Sound Data Storage Area H20*c*1, Dialing Sound Data Storage Area H20*c*2, and Waiting Sound Data Storage Area H20*c*3 of Host H (FIG. 429) are downloaded in Pre-dialing Sound Data Storage Area 20620*c*1, Dialing Sound Data Storage Area 20620*c*2, Waiting Sound Data Storage Area 20620*c*3, and Ringing Sound Data Storage Area 20620*c*4 of Communication Device 200, respectively. Here, each sound data stored in Communication Device 200 is identical to the one stored in Host H. For the avoidance of doubt, the sound data stored in Communication Device 200** do not need to be identical to the ones stored in Host H.

FIG. 452 illustrates another embodiment of the software program stored in PDWR Sound Selection Software Storage Area H**20*b* (FIG. 435) which enables to output sound data before storing in Communication Device 200. Referring to FIG. 452, CPU 211 (FIG. 1) displays on LCD 201 (FIG. 1) a list of sound data downloadable from Host H (FIG. 429) in categories (i.e., pre-dialing sound data, dialing sound data, waiting sound data, and ringing sound data) (S1). Next, the user of Communication Device 200 selects by utilizing Input Device 210 (FIG. 1) or via voice recognition system one of the sound data to be downloaded (S2). CPU 211 downloads the selected sound data in S2 (S3), and outputs it from Speaker 216 (FIG. 1) for demonstration when the user of Communication Device 200 inputs a specific signal by utilizing Input Device 210 (FIG. 1) or via voice recognition system which so indicates (S4). If CPU 211 detects a particular input signal input by the user of Communication Device 200 which indicates to store the sound data output in S4 (S5), CPU 211 selects one of the storage areas in PDWR Sound Selection Data Storage Area 20620***c* (FIG. 443) (S6), and stores the sound data therein (S7). For example, if the selected sound data is a pre-dialing sound data, the downloaded sound data is stored in Pre-dialing Sound Data Storage Area 20620*c*1 (FIG. 445). If the selected sound data is a dialing sound data, the downloaded sound data is stored in Dialing Sound Data Storage Area 20620*c*2 (FIG. 446). If the selected sound data is a waiting sound data, the downloaded sound data is stored in Waiting Sound Data Storage Area 20620*c*3 (FIG. 447). If the selected sound data is a ringing sound data, the downloaded sound data is stored in Ringing Sound Data Storage Area 20620*c*4 (FIG. 448).

FIG. 453 illustrates the method of selecting the sound data to be output via Speaker 216 (FIG. 1). Referring to FIG. 453, the user of Communication Device 200 selects by utilizing Input Device 210 (FIG. 1) or via voice recognition system the sound data to be output via Speaker 216. The selected sound data are marked as Sel as described in FIG. 453. In the example described in FIG. 453, Pre-dialing Sound Data H20*c*1*c*, Dialing Sound Data H20*c*2*c*, Waiting Sound Data H20*c*3*c*, and Ringing Sound Data H20*c*4*c* are selected to be output via Speaker 216.

FIG. 454 illustrates the software program stored in PDWR Sound Selection Software Storage Area H20*b* (FIG. 435) which implements the method described in FIG. 453 hereinbefore. Referring to FIG. 454, CPU 211 (FIG. 1) displays on LCD 201 (FIG. 1) a list of sound data in categories (i.e., pre-dialing sound data, dialing sound data, waiting sound data, and ringing sound data) (S1). Next, the user of Communication Device 200 selects by utilizing Input Device 210 (FIG. 1) or via voice recognition system the pre-dialing sound data (Pre-dialing Sound Data 20620*c*1*c* in the example described in FIG. 453) (S2), the dialing sound data (Dialing Sound Data 20620*c*2*c* in the example described in FIG. 453) (S3), the waiting sound data (Waiting Sound Data 20620*c*3*c* in the example described in FIG. 453) (S4), and the ringing sound data (Ringing Sound Data 20620*c*4*c* in the example described in FIG. 453), (S5). CPU 211 stores the sound data indexes of the sound data selected in S2 through S5 in PDWR Sound Data Index Storage Area 20620*d* (FIG. 443) (S6).

FIG. 455 illustrates the software program stored in PDWR Sound Selection Software Storage Area H20*b* (FIG. 435) which outputs the sound data selected in FIG. 454 hereinbefore until a voice communication is initiated by the user of Communication Device 200. Referring to FIG. 455, the user of Communication Device 200 selects the voice communication mode by utilizing Input Device 210 (FIG. 1) or via voice recognition system (S1). Then CPU 211 (FIG. 1) scans PDWR Sound Data Index Storage Area 20620*d* (FIG. 443) to identify the pre-dialing sound data selected in S2 of FIG. 454 (Pre-dialing Sound Data 20620*c*1*c* (FIG. 445) in the present example), which is output via Speaker 216 (FIG. 1) until the dialing process is initiated (S2). When the dialing process is initiated, CPU 211 scans PDWR Sound Data Index Storage Area 20620*d* to identify the dialing sound data selected in S3 of FIG. 454 (Dialing Sound Data 20620*c*2*c* (FIG. 446) in the present example), which is output via Speaker 216 during the dialing process (S3). Once the dialing process is completed, CPU 211 scans PDWR Sound Data Index Storage Area 20620*d* to identify the waiting sound data selected in S4 of FIG. 454 (Waiting Sound Data 20620*c*3*c* (FIG. 447) in the present example), which is output via Speaker 216 until the line is connected at the other end (S4). The voice communication is initiated thereafter (S5).

FIG. 456 illustrates the software program stored in PDWR Sound Selection Software Storage Area H20*b* (FIG. 435) which outputs the ringing sound data selected in S5 of FIG. 454 hereinbefore when receiving an incoming call. Referring to FIG. 456, CPU 211 (FIG. 1) periodically checks the wireless signals received via antenna 218 (FIG. 1) (S1). If the received wireless signal is an incoming call from another device for voice communication purposes (S2), CPU 211 scans PDWR Sound Data Index Storage Area 20620*d* to identify the ringing sound data (Ringing Sound Data 20620*c*4*c* (FIG. 448) in the present example), which is output via Speaker 216 until the user of Communication Device 200 initiates a voice communication (S3).

<<PDWR Sound Selecting Function—Summary>>

The foregoing inventions may be summarized as the following.

(1) A communication device which is capable to output a waiting sound data after a dialing process is completed and before said communication device initiates voice communication with other communication device, and which comprises a display, an input device, a speaker, wherein, a list of a plurality of said waiting sound data of different kinds is listed on said display, a certain waiting sound data is selected by utilizing said input device, said certain waiting sound data is output via said speaker after a dialing process is completed and before said communication device initiates voice communication with other communication device.

(2) An output waiting sound data implementing system comprising a host and a communication device, which enables said communication device to output a waiting sound data after a dialing process is completed and before said communication device initiates voice communication with other communication device, said host comprises a data storage area which stores a plurality of said waiting sound data of different kinds, said host transfers said a plurality of said waiting sound data of different kinds to said communication device, said communication device comprises an antenna, a display, an input device, a speaker, wherein, said communication device downloads said a plurality of said waiting sound data of different kinds via said antenna, a list of said plurality of said waiting sound data of different kinds is listed on said display, a certain waiting sound data is selected from said list by utilizing said input device, said certain waiting sound data is output via said speaker after a dialing process is completed and before said communication device initiates voice communication with other communication device.

(3) An output waiting sound data implementing system comprising a host and a communication device, which enables said communication device to output a waiting sound data after a dialing process is completed and before said communication device initiates voice communication with other communication device, said host comprises a data storage area which stores a plurality of said waiting sound data of different kinds, said host transfers said a plurality of said waiting sound data of different kinds to said communication device, in order for said communication device to output a certain waiting sound data of said plurality of said waiting sound data of different kinds after a dialing process is completed and before said communication device initiates voice communication with other communication device.

(4) The concept of the foregoing summaries (1), (2), and (3) can also be applied to a pre-dialing sound data which is output before said dialing process is initiated, and a dialing sound data which is output when implementing said dialing process.

<<Start Up Software Function>>

FIGS. 457 through 466 illustrate the start up software program function which enables Communication Device 200 to automatically activate (or start up) the registered software programs when the power is on.

FIG. 457 illustrates the overall sequence of the present function. Referring to FIG. 457, the user of Communication Device 200 presses the power button of Communication Device 200 (S1). Then the predetermined software programs automatically activate (or start up) without having any instructions from the user of Communication Device 200 (S2).

FIG. 458 illustrates the storage area included RAM 206 (FIG. 1). As described in FIG. 458, RAM 206 includes Start Up Information Storage Area 20621*a* which is described in FIG. 459 hereinafter.

FIG. 459 illustrates the storage areas included in Start Up Information Storage Area 20621*a* (FIG. 458). As described in FIG. 459, Start Up Information Storage Area 20621*a* includes Start Up Software Storage Area 20621*b* and Start Up Data Storage Area 20621*c*. Start Up Software Storage Area 20621*b* stores the software programs necessary to implement the present function, such as the ones described in FIG. 460 hereinafter. Start Up Data Storage Area 20621*c* stores the data necessary to implement the present function, such as the ones described in FIG. 462 hereinafter.

FIG. 460 illustrates the software programs stored in Start Up Software Storage Area 20621*b* (FIG. 459). As described in FIG. 460, Start Up Software Storage Area 20621*b* stores Power On Detecting Software 20621*b*1, Start Up Data Storage Area Scanning Software 20621*b*2, and Start Up Software Activating Software 20621*b*3. Power On Detecting Software 20621*b*1 detects whether the power of Communication Device 200 is on of which the sequence is described in FIG. 463 hereinafter, Start Up Data Storage Area Scanning Software 20621*b*2 identifies the software programs which are automatically activated of which the sequence is described in FIG. 464 hereinafter, and Start Up Software Activating Software 20621*b*3 activates the identified software programs identified by Start Up Data Storage Area Scanning Software 20621*b*2 of which the sequence is described in FIG. 465 hereinafter.

FIG. 461 illustrates the storage area included in Start Up Data Storage Area 20621*c* (FIG. 459). As described in FIG. 461, Start Up Data Storage Area 20621*c* includes Start Up Software Index Storage Area 20621*c*1. Here, Start Up Software Index Storage Area 20621*c*1 stores the software program indexes, wherein a software program index is an unique information assigned to each software program as an identifier (e.g., title of a software program) of which the details are explained in FIG. 462 hereinafter.

FIG. 462 illustrates the data stored in Start Up Software Index Storage Area 20621*c*1 (FIG. 461). Referring to FIG. 462, Start Up Software Index Storage Area 20621*c*1 stores the software program indexes of the software programs which are automatically activated by the present function. Here, the software programs may be any software programs explained in this specification, and the storage areas where these software programs are stored are explained in the relevant drawing figures thereto. Three software program indexes, i.e., Start Up Software Index 20621*c*1*a*, Start Up Software Index 20621*c*1*b*, and Start Up Software Index 20621*c*1*c*, are stored in Start Up Software Index Storage Area 20621*c*1 in the present example. The software program indexes can be created and store in Start Up Software Index Storage Area 20621*c*1 manually by utilizing input device 210 (FIG. 1) or via voice recognition system.

FIG. 463 illustrates the sequence of Power On Detecting Software 20621*b*1 stored in Start Up Software Storage Area 20621*b* (FIG. 460). As described in FIG. 463, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 activates Start Up Data Storage Area Scanning Software 20621*b*2 (FIG. 460) of which the sequence is explained in FIG. 464 hereinafter.

FIG. 464 illustrates the sequence of Start Up Data Storage Area Scanning Software 20621*b*2 stored in Start Up Software Storage Area 20621*b* (FIG. 460). As described in FIG. 464, CPU 211 (FIG. 1) scans Start Up Software Index Storage Area 20621*c*1 (FIG. 462) (S1), and identifies the software programs which are automatically activated (S2). CPU 211 activates Start Up Software Activating Software 20621*b*3 (FIG. 460) thereafter of which the sequence is explained in FIG. 465 hereinafter (S3).

FIG. 465 illustrates the sequence of Start Up Software Activating Software 20621*b*3 stored in Start Up Software Storage Area 20621*b* (FIG. 460). As described in FIG. 465, CPU 211 (FIG. 1) activates the software programs of which the software program indexes are identified in S2 of FIG. 464 hereinbefore (S1).

FIG. 466 illustrates another embodiment wherein the three software programs stored in Start Up Software Storage Area 20621*b* (FIG. 460) (i.e., Power On Detecting Software 20621*b*1, Start Up Data Storage Area Scanning Software 20621*b*2, Start Up Software Activating Software 20621*b*3) is integrated into one software program stored therein. Referring to FIG. 466, CPU 211 (FIG. 1) checks the status of the power condition of Communication Device 200 (S1). When the user of Communication Device 200 powers on Communication Device 200 by utilizing input device 210 (FIG. 1), such as by pressing a power button (S2), CPU 211 scans Start Up Software Index Storage Area 20621*c*1 (FIG. 461) (S3), and identifies the software programs which are automatically activated (S4). CPU 211 activates the software programs thereafter of which the software program indexes are identified in S4 (S5).

As another embodiment, the software programs per se (not the software program indexes as described in FIG. 462) may be stored in a specific storage area which are activated by the present function.

As another embodiment, the present function may be implemented at the time the user of Communication Device 200 logs on instead of at the time the Communication Device 200 is powered as described in S2 of FIG. 463.

<<Start Up Software Function—Summary>>

The foregoing inventions may be summarized as the following.

A communication device comprising a power button, a CPU, a software program storage means, a software program index storage area, said software program storage means stores one or more of software programs, said software program index storage area stores one or more of software program indexes, wherein, at the time said power button is pressed, said CPU scans said software program index storage area, and activates software programs stored in said software program storage means identified by said one or more of software program indexes.

<<Another Embodiment of Communication Device 200>>

FIGS. 467*a* through 467*d* illustrate another embodiment of Communication Device 200 described in FIGS. 1 and 380. Referring to FIGS. 467*a* through 467*d*, CPU 211 controls and administers the overall function and operation of Communication Device 200. CPU 211 utilizes RAM 206 as a work area to perform calculation, and to implement the modes, functions, and systems explained in this specification. Video Processor 202 generates stereo video signals. Wireless Transmitter 222 transmits the stereo video signals generated by Video Processor 202 in a wireless fashion, which is received by Wireless Receiver 224. Data Bus 203 is composed of Data Bus 203*a*, Data Bus 203*b*, and Data Bus 203*c* as described in the present drawing. LCD 201L and LCD 201R display the received stereo video signals in a stereo fashion. ROM 207 stores the data and software programs which are essential to operate Communication Device 200. Wireless signals are received by Antenna 218 and processed by Signal Processor 208. Input signals are input by Input Device 210, such as a dial pad, a joystick, and/or a keypad, and the input signals are transferred via Input Interface 209 and Data Bus 203 to CPU 211. Indicator 212 is an LED lamp which is designed to output different colors (e.g., red, blue, and green, etc). Stereo audio data are input to Microphone 215L and Microphone 215R in a stereo fashion. The input stereo audio data are transferred via Wireless Transmitter 227 in a wireless fashion to Wireless Receiver 226. Wireless Receiver 226 transfers the received stereo audio data to Signal Processor 205. Signal Processor 205 processes the received stereo audio data under the control of CPU 211. Signal Processor 205 also generates stereo audio data under the control of CPU 211 which are transferred via Wireless Transmitter 223 in a wireless fashion to Wireless Receiver 225. Wireless Receiver 225 transfers the received stereo audio data to Speaker 216L and Speaker 216R, which output stereo audio data in a stereo fashion. CCD Unit 214 captures video images which are stored in RAM 206 in a digital format. Vibrator 217 vibrates Communication Device 200 under the command of CPU 211. LED 219 receives infra red signals from other wireless devices, which are transferred to CPU 211 via Data Bus 203. LED 219 also sends infra red signals in a wireless fashion which are composed by CPU 211 and transferred via Data Bus 203. As a second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 except that LED 219 utilizes infra red signals for implementing wireless communication in the second embodiment. Flash Light Unit 220 emits light under the command of CPU 211 transferred via Data Bus 203, which is utilized for flash light purposes and as a strobe unit when taking videos and/or photos by CCD Unit 214. Memory Card 228 is a removable or detachable storage media which stores any information, data, and/or software program, and is accessed by CPU 211 via Memory Card Interface 221. Memory Card 228 may be utilized as a substitute of RAM 206. Photometer 232 is a sensor which detects the brightness (i.e., the light intensity). LCD 201L, LCD 201R are wearable and/or head-mountable as described in the following patents and the references cited thereof: U.S. Pat. No. 6,496,161; U.S. Pat. No. 6,487,021; U.S. Pat. No. 6,462,882; U.S. Pat. No. 6,452,572; U.S. Pat. No. 6,448,944; U.S. Pat. No. 6,445,364; U.S. Pat. No. 6,445,363; U.S. Pat. No. 6,424,321; U.S. Pat. No. 6,421,183; U.S. Pat. No. 6,417,820; U.S. Pat. No. 6,388,814; U.S. Pat. No. 6,388,640; U.S. Pat. No. 6,369,952; U.S. Pat. No. 6,359,603; U.S. Pat. No. 6,359,602; U.S. Pat. No. 6,356,392; U.S. Pat. No. 6,353,503; U.S. Pat. No. 6,349,001; U.S. Pat. No. 6,329,965; U.S. Pat. No. 6,304,303; U.S. Pat. No. 6,271,808; U.S. Pat. No. 6,246,383; U.S. Pat. No. 6,239,771; U.S. Pat. No. 6,232,934; U.S. Pat. No. 6,222,675; U.S. Pat. No. 6,219,186; U.S. Pat. No. 6,204,974; U.S. Pat. No. 6,181,304; U.S. Pat. No. 6,160,666; U.S. Pat. No. 6,157,291; U.S. Pat. No. 6,147,807; U.S. Pat. No. 6,147,805; U.S. Pat. No. 6,140,980; U.S. Pat. No. 6,127,990; U.S. Pat. No. 6,124,837; U.S. Pat. No. 6,115,007; U.S. Pat. No. 6,097,543; U.S. Pat. No. 6,094,309; U.S. Pat. No. 6,094,242; U.S. Pat. No. 6,091,546; U.S. Pat. No. 6,084,556; U.S. Pat. No. 6,072,445; U.S. Pat. No. 6,055,110; U.S. Pat. No. 6,055,109; U.S. Pat. No. 6,050,717; U.S. Pat. No. 6,040,945; U.S. Pat. No. 6,034,653; U.S. Pat. No. 6,023,372; U.S. Pat. No. 6,011,653; U.S. Pat. No. 5,995,071; U.S. Pat. No. 5,991,085; U.S. Pat. No. 5,982,343; U.S. Pat. No. 5,971,538; U.S. Pat. No. 5,966,242; U.S. Pat. No. 5,959,780; U.S. Pat. No. 5,954,642; U.S. Pat. No. 5,949,583; U.S. Pat. No. 5,943,171; U.S. Pat. No. 5,923,476; U.S. Pat. No. 5,903,396; U.S. Pat. No. 5,903,395; U.S. Pat. No. 5,900,849; U.S. Pat. No. 5,880,773; U.S. Pat. No. 5,864,326; U.S. Pat. No. 5,844,656; U.S. Pat. No. 5,844,530; U.S. Pat. No. 5,838,490; U.S. Pat. No. 5,835,279; U.S. Pat. No. 5,822,127; U.S. Pat. No. 5,808,802; U.S. Pat. No. 5,808,801; U.S. Pat. No. 5,774,096; U.S. Pat. No. 5,767,820; U.S. Pat. No. 5,757,339; U.S. Pat. No. 5,751,493; U.S. Pat. No. 5,742,264; U.S. Pat. No. 5,739,955; U.S. Pat. No. 5,739,797; U.S. Pat. No. 5,708,449; U.S. Pat. No. 5,673,059; U.S. Pat. No. 5,670,970; U.S. Pat. No. 5,642,221; U.S. Pat. No. 5,619,377; U.S. Pat. No. 5,619,373; U.S. Pat. No. 5,606,458; U.S. Pat. No. 5,572,229; U.S. Pat. No. 5,546,099; U.S. Pat. No. 5,543,816; U.S. Pat. No. 5,539,422; U.S. Pat. No. 5,537,253; U.S. Pat. No. 5,526,184; U.S. Pat. No. 5,486,841; U.S. Pat. No. 5,483,307; U.S. Pat. No. 5,341,242; U.S. Pat. No. 5,281,957; and U.S. Pat. No. 5,003,300. As another embodiment, LCD 201L, LCD 201R, Wireless Receiver 224, and Video Processor 202 may be integrated into one unit. Solar Panel 229 is a panel which converts sunlight to electricity, under the control of CPU 211. Solar Panel 229 is connected to Battery 230 by a cable (not shown in the drawing) to charge Battery 230. The concept of the mechanism and the utilization of Solar Panel 229 and Battery 230 are introduced in the following invention and the references cited thereof: U.S. Pat. No. 5,542,203.

When Communication Device 200 is in a voice communication mode, the stereo audio data input to Microphone 215L and Microphone 215R are transferred to another device via Antenna 218 (or LED 219) in a wireless fashion after being processed by Signal Processor 208, and the wireless signal representing the stereo audio data which are received via Antenna 218 (or LED 219) is output from Speaker 216L and Speaker 216R after being processed by Signal Processor 208. Communication Device 200 is also capable to process monoral audio data. Namely, when Communication Device 200 is in a voice communication mode, the monoral audio data input to Microphone 215L and/or Microphone 215R are transferred to another device via Antenna 218 (or LED 219) in a wireless fashion after being processed by Signal Processor 208, and the wireless signal representing the monoral audio data which are received via Antenna 218 (or LED 219) is output from Speaker 216L and/or Speaker 216R after being processed by Signal Processor 208.

For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218 (or LED 219). The size of Communication Device 200 is irrelevant so long as it is mobile and/or portable.

For the avoidance of doubt, the reference to FIG. 1 (e.g., referring to FIG. 1 in parenthesis) automatically refers to FIG. 380 and to FIGS. 467*a* through 467*d* in this specification; the reference to FIG. 380 (e.g., referring to FIG. 380 in parenthesis) automatically refers to FIG. 1 and to FIGS. 467*a* through 467*d* in this specification; and the reference to FIG. 467 (e.g., referring to FIG. 467 in parenthesis) automatically refers to FIG. 1 and to FIG. 380 in this specification.

<<Stereo Audio Data Output Function>>

FIGS. 468 through 479 illustrate the stereo audio data output function which enables Communication Device 200 to output audio data from Speakers 216L and 216R (FIG. 467*c*) in a stereo fashion.

FIG. 468 illustrates the storage area included in Host Data Storage Area H00*c* (FIG. 430) of Host H (FIG. 429). As described in FIG. 468, Host Data Storage Area H00*c* includes Stereo Audio Information Storage Area H22*a*. Stereo Audio Information Storage Area H22*a* stores the software programs and data necessary to implement the present function as described in details hereinafter.

FIG. 469 illustrates the storage areas included in Stereo Audio Information Storage Area H22*a* (FIG. 468). As described in FIG. 469, Stereo Audio Information Storage Area H22*a* includes Stereo Audio Software Storage Area H22*b* and Stereo Audio Data Storage Area H22*c*. Stereo Audio Software Storage Area H22*b* stores the software programs necessary to implement the present function, such as the one described in FIG. 472 hereinafter. Stereo Audio Data Storage Area H22*c* stores the data necessary to implement the present function, such as the ones described in FIG. 470 hereinafter.

FIG. 470 illustrates the stereo audio data stored in Stereo Audio Data Storage Area H22*c* (FIG. 469). A plurality of stereo audio data are stored in Stereo Audio Data Storage Area H22*c*. In the example described in FIG. 470, three stereo audio data, i.e., Stereo Audio Data H22*c*1, Stereo Audio Data H22*c*2, and Stereo Audio Data H22*c*3 are stored therein.

FIG. 471 illustrates the components of the stereo audio data stored in Stereo Audio Data Storage Area H22*c* (FIG. 470). FIG. 471 describes the components of Stereo Audio Data H22*c*1 (FIG. 470) as an example. As described in FIG. 471, Stereo Audio Data H22*c*1 includes Left Speaker Audio Data H22*c*1L, Right Speaker Audio Data H22*c*1R, and Stereo Audio Data Output Timing Data H22*c*1T. Left Speaker Audio Data H22*c*1L is an audio data which is designed to be output from Speaker 216L (FIG. 467*c*). Right Speaker Audio Data H22*c*1R is an audio data which is designed to be output from Speaker 216R (FIG. 467*c*). Stereo Audio Data Output Timing Data H22*c*1T is a timing data which is utilized to synchronize the output of both Left Speaker Audio Data H22*c*1L and Right Speaker Audio Data H22*c*1R from Speaker 216R and Speaker 216L respectively.

FIG. 472 illustrates the sequence of the software program stored in Stereo Audio Software Storage Area H22*b* (FIG. 469). Referring to FIG. 472, the software program stored in Stereo Audio Software Storage Area H22*b* extracts one of the stereo audio data stored in Stereo Audio Data Storage Area H22*c* (FIG. 470) and creates Transferred Stereo Audio Data TSAD for purposes of transferring the extracted stereo audio data to Communication Device 200 (S1).

FIG. 473 illustrates the components of Transferred Stereo Audio Data TSAD created by the software program stored in Stereo Audio Software Storage Area H22*b* (FIG. 472). As described in FIG. 473, Transferred Stereo Audio Data TSAD is composed of Header TSAD1, Com Device ID TSAD2, Host ID TSAD3, Transferred Stereo Audio Data TSAD4, and Footer TSAD5. Com Device ID TSAD2 indicates the identification of Communication Device 200, Host ID TSAD3 indicates the identification of Host H (FIG. 429), and Transferred Stereo Audio Data TSAD4 is the stereo audio data extracted in the manner described in FIG. 472. Header TSAD1 and Footer TSAD5 indicate the beginning and the end of Transferred Stereo Audio Data TSAD.

FIG. 474 illustrates the storage area included in RAM 206 (FIG. 1) of Communication Device 200 (FIG. 429). As described in FIG. 474, RAM 206 includes Stereo Audio Information Storage Area 20622*a*. Stereo Audio Information Storage Area 20622*a* stores the software programs and data necessary to implement the present function as described in details hereinafter.

FIG. 475 illustrates the storage areas included in Stereo Audio Information Storage Area 20622*a* (FIG. 474). As described in FIG. 475, Stereo Audio Information Storage Area 20622*a* includes Stereo Audio Software Storage Area 20622*b* and Stereo Audio Data Storage Area 20622*c*. Stereo Audio Software Storage Area 20622*b* stores the software programs necessary to implement the present function, such as the ones described in FIGS. 478 and 479 hereinafter. Stereo Audio Data Storage Area 20622*c* stores the data necessary to implement the present function, such as the ones described in FIG. 476 hereinafter.

FIG. 476 illustrates the stereo audio data stored in Stereo Audio Data Storage Area 20622*c* (FIG. 475). A plurality of stereo audio data are stored in Stereo Audio Data Storage Area 20622*c*. In the example described in FIG. 476, three stereo audio data, i.e., Stereo Audio Data 20622*c*1, Stereo Audio Data 20622*c*2, and Stereo Audio Data 20622*c*3 are stored therein.

FIG. 477 illustrates the components of the stereo audio data stored in Stereo Audio Data Storage Area 20622*c* (FIG. 476). FIG. 477 describes the components of Stereo Audio Data 20622*c*1 (FIG. 476) as an example. As described in FIG. 477, Stereo Audio Data 20622*c*1 includes Left Speaker Audio Data 20622*c*1L, Right Speaker Audio Data 20622*c*1R, and Stereo Audio Data Output Timing Data 20622*c*1T. Left Speaker Audio Data 20622*c*1L is an audio data which is designed to be output from Speaker 216L (FIG. 467*c*). Right Speaker Audio Data 20622*c*1R is an audio data which is designed to be output from Speaker 216R (FIG. 467*c*). Stereo Audio Data Output Timing Data 20622*c*1T is a timing data which is utilized to synchronize the output of both Left Speaker Audio Data 20622*c*1L and Right Speaker Audio Data 20622*c*1R from Speaker 216R and Speaker 216L respectively.

With regard to the process of selecting and downloading the stereo audio data to Communication Device 200, the concept illustrated in FIGS. 401 through 407 applies hereto. The downloaded stereo audio data are stored in specific area(s) of Stereo Audio Data Storage Area 20622*c* (FIG. 476).

FIG. 478 illustrates the sequence of selecting and preparing to output the stereo audio data from Speakers 216L and 216R (FIG. 467*c*) in a stereo fashion. As described in FIG. 478, a list of stereo audio data is displayed on LCD 201 (FIG. 1) (S1). The user of Communication Device 200 selects one stereo audio data by utilizing Input Device 210 (FIG. 1) or via voice recognition system (S2). Assuming Stereo Audio Data 20622*c*1 is selected (FIG. 476) in S2, CPU 211 (FIG. 1) retrieves Left Speaker Audio Data 20622*c*1L (S3), Right Speaker Audio Data 20622*c*1R (S4), and Stereo Audio Data Output Timing Data **20622*c*1T from Stereo Audio Data Storage Area 20622*c* (FIG. 476) (S5**).

FIG. 479 illustrates the sequence of outputting the stereo audio data from Speakers 216L and 216R (FIG. **467*c*) in a stereo fashion. As described in FIG. 479, the user of Communication Device 200 inputs a specific signal to output the stereo audio data by utilizing Input Device 210 (FIG. 1) or via voice recognition system (S1). Assuming Audio Data 20622*c*1 (FIG. 476) is selected in S2 of FIG. 478, CPU 211 outputs Left Speaker Audio Data 20622*c*1L (FIG. 477) and Right Speaker Audio Data 20622*c*1R (FIG. 477) from Speakers 216L and 216R respectively in a stereo fashion in accordance with Stereo Audio Data Output Timing Data 20622*c*1T (FIG. 477) (S2**).

<<Stereo Audio Data Output Function—Summary>>

The foregoing inventions may be summarized as the following.

(1) A communication device comprising a wireless communication unit, a microphone, a left speaker, a right speaker, a display, and an input device, wherein said communication device functions in a voice communication mode and a stereo audio data output mode, said microphone is utilized for inputting audio data of a first person which is transferred via said wireless communication unit, and said left speaker, and said right speaker are utilized for outputting audio data of a second person when said communication device is in said voice communication mode, a list of stereo audio data is displayed on said display, a selected stereo audio data is selected from said list via said input device, said selected stereo audio data is output from said left speaker and said right speaker in a stereo fashion when said communication device is in said stereo audio data output mode.

(2) A host comprising a stereo audio data storage area in which a plurality of stereo audio data are stored, said host is capable to send and receive data, wherein said host retrieves from said stereo audio data storage area and sends a selected stereo audio data requested by a request data sent by said wireless communication device to said wireless communication device for purposes of said communication device to receive said selected stereo audio data via a wireless communication unit and output said selected stereo audio data from a left speaker and a right speaker of said wireless communication device when said wireless communication device is in a stereo audio data output mode.

(3) A stereo audio data output system comprising a host and a communication device, said host comprises a stereo audio data storage area in which a plurality of stereo audio data are stored, said host is capable to send and receive data with a wireless communication device, said host retrieves from said stereo audio data storage area and sends a selected stereo audio data requested by a request data sent by said wireless communication device to said wireless communication device, said communication device comprises a wireless communication unit, a microphone, a left speaker, a right speaker, a display, and an input device, said communication device functions in a voice communication mode and a stereo audio data output mode, said microphone is utilized for inputting audio data of a first person which is transferred via said wireless communication unit, and said left speaker, and said right speaker are utilized for outputting audio data of a second person when said communication device is in said voice communication mode, said selected stereo audio data is output from said left speaker and said right speaker in a stereo fashion when said communication device is in said stereo audio data output mode.

<<Stereo Visual Data Output Function>>

FIGS. 480 through 491 illustrate the stereo visual data output function which enables Communication Device 200 to output visual data from LCDs 201L and 201R (FIG. **467*b***) in a stereo fashion.

FIG. 480 illustrates the storage area included in Host Data Storage Area H**00*c* (FIG. 430) of Host H (FIG. 429). As described in FIG. 480, Host Data Storage Area H00*c* includes Stereo Visual Information Storage Area H23*a*. Stereo Visual Information Storage Area H23*a*** stores the software programs and data necessary to implement the present function as described in details hereinafter.

FIG. 481 illustrates the storage areas included in Stereo Visual Information Storage Area H**23*a* (FIG. 480). As described in FIG. 481, Stereo Visual Information Storage Area H23*a* includes Stereo Visual Software Storage Area H23*b* and Stereo Visual Data Storage Area H23*c*. Stereo Visual Software Storage Area H23*b* stores the software programs necessary to implement the present function, such as the one described in FIG. 484 hereinafter. Stereo Visual Data Storage Area H23*c* stores the data necessary to implement the present function, such as the ones described in FIG. 482** hereinafter.

FIG. 482 illustrates the stereo visual data stored in Stereo Visual Data Storage Area H**23*c* (FIG. 481). A plurality of stereo visual data are stored in Stereo Visual Data Storage Area H23*c*. In the example described in FIG. 482, three stereo visual data, i.e., Stereo Visual Data H23*c*1, Stereo Visual Data H23*c*2, and Stereo Visual Data H23*c*3** are stored therein.

FIG. 483 illustrates the components of the stereo visual data stored in Stereo Visual Data Storage Area H**23*c* (FIG. 482). FIG. 483 describes the components of Stereo Visual Data H23*c*1 (FIG. 482) as an example. As described in FIG. 483, Stereo Visual Data H23*c*1 includes Left LCD Visual Data H23*c*1L, Right LCD Visual Data H23*c*1R, and Stereo Visual Data Output Timing Data H23*c*1T. Left LCD Visual Data H23*c*1L is a visual data which is designed to be output from LCD 201L (FIG. 467*b*). Right LCD Visual Data H23*c*1R is a visual data which is designed to be output from LCD 201R (FIG. 467*b*). Stereo Visual Data Output Timing Data H23*c*1T is a timing data which is utilized to synchronize the output of both Left LCD Visual Data H23*c*1L and Right LCD Visual Data H23*c*1R from LCD 201R and LCD 201**L respectively.

FIG. 484 illustrates the sequence of the software program stored in Stereo Visual Software Storage Area H**23*b* (FIG. 481). Referring to FIG. 484, the software program stored in Stereo Visual Software Storage Area H23*b* extracts one of the stereo visual data stored in Stereo Visual Data Storage Area H23*c* (FIG. 482) and creates Transferred Stereo Visual Data TSVD for purposes of transferring the extracted stereo visual data to Communication Device 200 (S1**).

FIG. 485 illustrates the components of Transferred Stereo Visual Data TSVD created by the software program stored in Stereo Visual Software Storage Area H**23*b* (FIG. 484). As described in FIG. 485, Transferred Stereo Visual Data TSVD is composed of Header TSVD1, Com Device ID TSVD2, Host ID TSVD3, Transferred Stereo Visual Data TSVD4, and Footer TSVD5. Com Device ID TSVD2 indicates the identification of Communication Device 200, Host ID TSVD3 indicates the identification of Host H (FIG. 429), and Transferred Stereo Visual Data TSVD4 is the stereo visual data extracted in the manner described in FIG. 484. Header TSVD1 and Footer TSVD5** indicate the beginning and the end of Transferred Stereo Visual Data TSVD.

FIG. 486 illustrates the storage area included in RAM 206 (FIG. 1) of Communication Device 200 (FIG. 429). As described in FIG. 486, RAM 206 includes Stereo Visual Information Storage Area 20623*a*. Stereo Visual Information Storage Area 20623*a* stores the software programs and data necessary to implement the present function as described in details hereinafter.

FIG. 487 illustrates the storage areas included in Stereo Visual Information Storage Area 20623*a* (FIG. 486). As described in FIG. 487, Stereo Visual Information Storage Area 20623*a* includes Stereo Visual Software Storage Area 20623*b* and Stereo Visual Data Storage Area 20623*c*. Stereo Visual Software Storage Area 20623*b* stores the software programs necessary to implement the present function, such as the ones described in FIGS. 490 and 491 hereinafter. Stereo Visual Data Storage Area 20623*c* stores the data necessary to implement the present function, such as the ones described in FIG. 488 hereinafter.

FIG. 488 illustrates the stereo visual data stored in Stereo Visual Data Storage Area 20623*c* (FIG. 487). A plurality of stereo visual data are stored in Stereo Visual Data Storage Area 20623*c*. In the example described in FIG. 488, three stereo visual data, i.e., Stereo Visual Data 20623*c*1, Stereo Visual Data 20623*c*2, and Stereo Visual Data 20623*c*3 are stored therein.

FIG. 489 illustrates the components of the stereo visual data stored in Stereo Visual Data Storage Area 20623*c* (FIG. 488). FIG. 489 describes the components of Stereo Visual Data 20623*c*1 (FIG. 488) as an example. As described in FIG. 489, Stereo Visual Data 20623*c*1 includes Left LCD Visual Data 20623*c*1L, Right LCD Visual Data 20623*c*1R, and Stereo Visual Data Output Timing Data 20623*c*1T. Left LCD Visual Data 20623*c*1L is a visual data which is designed to be output from LCD 201L (FIG. 467*b*). Right LCD Visual Data 20623*c*1R is a visual data which is designed to be output from LCD 201R (FIG. 467*b*). Stereo Visual Data Output Timing Data 20623*c*1T is a timing data which is utilized to synchronize the output of both Left LCD Visual Data 20623*c*1L and Right LCD Visual Data 20623*c*1R from LCD 201R and LCD 201L respectively.

With regard to the process of selecting and downloading the stereo visual data to Communication Device 200, the concept illustrated in FIGS. 401 through 407 applies hereto. The downloaded stereo visual data are stored in specific area(s) of Stereo Visual Data Storage Area 20623*c* (FIG. 488).

FIG. 490 illustrates the sequence of selecting and preparing to output the stereo visual data from LCDs 201L and 201R (FIG. 467*b*) in a stereo fashion. As described in FIG. 490, a list of stereo visual data is displayed on LCD 201 (FIG. 1) (S1). The user of Communication Device 200 selects one stereo visual data by utilizing Input Device 210 (FIG. 1) or via voice recognition system (S2). Assuming Stereo Visual Data 20623*c*1 is selected (FIG. 488) in S2, CPU 211 (FIG. 1) retrieves Left LCD Visual Data 20623*c*1L (S3), Right LCD Visual Data 20623*c*1R (S4), and Stereo Visual Data Output Timing Data 20623*c*1T from Stereo Visual Data Storage Area 20623*c* (FIG. 488) (S5).

FIG. 491 illustrates the sequence of outputting the stereo visual data from LCDs 201L and 201R (FIG. 467*b*) in a stereo fashion. As described in FIG. 491, the user of Communication Device 200 inputs a specific signal to output the stereo visual data by utilizing Input Device 210 (FIG. 1) or via voice recognition system (S1). Assuming Visual Data 20623*c*1 (FIG. 488) is selected in S2 of FIG. 490, CPU 211 outputs Left LCD Visual Data 20623*c*1L (FIG. 489) and Right LCD Visual Data 20623*c*1R (FIG. 489) from LCDs 201L and 201R respectively in a stereo fashion in accordance with Stereo Visual Data Output Timing Data 20623*c*1T (FIG. 489) (S2).

<<Stereo Visual Data Output Function—Summary>>

The foregoing inventions may be summarized as the following.

(1) A communication device comprising a wireless communication unit, a microphone, a left LCD, a right LCD, a display, and an input device, wherein said communication device functions in a voice communication mode and a stereo visual data output mode, said microphone is utilized for inputting visual data of a first person which is transferred via said wireless communication unit, and said left LCD, and said right LCD are utilized for outputting visual data of a second person when said communication device is in said voice communication mode, a list of stereo visual data is displayed on said display, a selected stereo visual data is selected from said list via said input device, said selected stereo visual data is output from said left LCD and said right LCD in a stereo fashion when said communication device is in said stereo visual data output mode.

(2) A host comprising a stereo visual data storage area in which a plurality of stereo visual data are stored, said host is capable to send and receive data, wherein said host retrieves from said stereo visual data storage area and sends a selected stereo visual data requested by a request data sent by said wireless communication device to said wireless communication device for purposes of said communication device to receive said selected stereo visual data via a wireless communication unit and output said selected stereo visual data from a left LCD and a right LCD of said wireless communication device when said wireless communication device is in a stereo visual data output mode.

(3) A stereo visual data output system comprising a host and a communication device, said host comprises a stereo visual data storage area in which a plurality of stereo visual data are stored, said host is capable to send and receive data with a wireless communication device, said host retrieves from said stereo visual data storage area and sends a selected stereo visual data requested by a request data sent by said wireless communication device to said wireless communication device, said communication device comprises a wireless communication unit, a microphone, a left LCD, a right LCD, a display, and an input device, said communication device functions in a voice communication mode and a stereo visual data output mode, said microphone is utilized for inputting visual data of a first person which is transferred via said wireless communication unit, and said left LCD, and said right LCD are utilized for outputting visual data of a second person when said communication device is in said voice communication mode, said selected stereo visual data is output from said left LCD and said right LCD in a stereo fashion when said communication device is in said stereo visual data output mode.

<<Multiple Signal Processing Function>>

FIGS. 492 through 529 illustrate the multiple signal processing function which enables Communication Device 200 to implement wireless communication in various types of wireless signals, for example, cdma2000, W-CDMA, and TDS-CDMA (For the avoidance of doubt, the term 'TDS-CDMA' is equivalent to 'TDD' and 'TD-CDMA' in this specification).

FIG. 492 illustrates the elements of Signal Processor 208 (FIG. 1). As described in FIG. 492, Signal Processor 208 includes CDMA2000 Signal Processor 20824*a*, W-CDMA Signal Processor 20824*b*, TDS-CDMA Signal Processor 20824*c*, and Signal Type Detector 20824*d*. CDMA2000 Signal Processor 20824*a* is a hardware circuit to convert the cdma2000 signals into CPU readable data and to convert the CPU readable data into cdma 2000 signals. W-CDMA Signal Processor 20824*b* is a hardware circuit to convert the W-CDMA signals into CPU readable data and to convert the CPU readable data into W-CDMA signals. TDS-CDMA Signal Processor 20824*c* is a hardware circuit to convert the TDS-CDMA signals into CPU readable data and to convert the CPU readable data into TDS-CDMA signals. Signal Type Detector 20824*d* is a hardware circuit to detect the type of the signal received via Antenna 218 of which the elements are described in FIG. 493 hereinafter. For the avoidance of doubt, process or signal process means converting a certain type of signal into a CPU readable data and/or converting a CPU readable data into a certain type of signal in this specification.

FIG. 493 illustrates the elements of Signal Type Detector 20824*d* (FIG. 492). As described in FIG. 493, Signal Type Detector 20824*d* includes Signal Type Detecting Software Storage Area 20824*d*1 and Signal Processing CPU 20824*d*2. Signal Type Detecting Software Storage Area 20824*d*1 stores the software programs to detect the type of the signal to be utilized for the signal process of which the sequence is described hereinafter. Signal Processing CPU 20824*d*2 is a central processing unit to execute the software program stored in Signal Type Detecting Software Storage Area 20824*d*1.

FIG. 493*a* illustrates the software program stored in Signal Type Detecting Software Storage Area 20824*d*1 (FIG. 493) executed by Signal Processing CPU 20824*d*2 (FIG. 493) to send an inquiry signal. Here, the inquiry signal is a signal sent via Antenna 218 (FIG. 1) to identify the type of signal to be utilized for the signal process. Referring to FIG. 493*a*, Signal Processing CPU 20824*d*2 periodically sends inquiry signals by utilizing cdma2000 signal, W-CDMA signal, and TDS-CDMA signal via Antenna 218 (FIG. 1).

FIG. 494 illustrates the software program stored in Signal Type Detecting Software Storage Area 20824*d*1 (FIG. 493) executed by Signal Processing CPU 20824*d*2 (FIG. 493) to determine the type of signal to be utilized for the signal process. As described in FIG. 494, Signal Processing CPU 20824*d*2 periodically checks the incoming signals received via Antenna 218 (FIG. 1) (S1). If the incoming signal is a response signal of a certain signal level (S2), Signal Processing CPU 20824*d*2 identifies the type of the signal, and sets a path to the relevant signal processor and forwards the received signal thereto (S4). For example, if the identified signal is a cdma2000 signal, Signal Processing CPU 20824*d*2 sets a path to CDMA2000 Signal Processor 20824*a* (FIG. 492) and forwards the received signal thereto. If the identified signal is a W-CDMA signal, Signal Processing CPU 20824*d*2 sets a path to W-CDMA Signal Processor 20824*b* (FIG. 492) and forwards the received signal thereto. If the identified signal is a TDS-CDMA signal, Signal Processing CPU 20824*d*2 sets a path to TDS-CDMA Signal Processor 20824*c* (FIG. 492) and forwards the received signal thereto. The signal processor to which the path is set performs the signal process hereafter.

FIG. 495 illustrates the second embodiment of Signal Processor 208. As described in FIG. 495, Signal Processor 208 includes CDMA2000 Signal Processor 20824*a*, W-CDMA Signal Processor 20824*b*, and TDS-CDMA Signal Processor 20824*c*, all of which are directly connected to Antenna 218 (FIG. 1). CDMA2000 Signal Processor 20824*a* is a hardware circuit to process cdma2000 signals of which the details are described in FIGS. 496 through 497. W-CDMA Signal Processor 20824*b* is a hardware circuit to process W-CDMA signals of which the details are described in FIGS. 498 through 499. TDS-CDMA Signal Processor 20824*c* is a hardware circuit to process TDS-CDMA signals of which the details are described in FIGS. 500 through 501.

FIG. 496 illustrates CDMA2000 Signal Processor 20824*a* (FIG. 495) of the second embodiment. As described in FIG. 496, CDMA2000 Signal Processor 20824*a* includes CDMA2000 Signal Processing Software Storage Area 20824*a*1 of which the software program stored therein is described in FIGS. 496*a* and 497 hereinafter.

FIG. 496*a* illustrates the software program stored in CDMA2000 Signal Processing 24*a*1 (FIG. 496) to send an inquiry signal. Here, the inquiry signal is a cdma2000 signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal. Referring to FIG. 496*a*, CDMA2000 Signal Processor 20824*a* periodically sends an inquiry signal by utilizing cdma2000 signal via Antenna 218 (FIG. 1).

FIG. 497 illustrates the software program stored in CDMA2000 Signal Processing Software Storage Area 20824*a*1 (FIG. 496). Referring to FIG. 497, CDMA2000 Signal Processor 20824*a* (FIG. 496) periodically checks the incoming signal received via Antenna 218 (FIG. 1) (S1). If the incoming signal is a response signal utilizing cdma2000 signal (S2), CDMA2000 Signal Processor 20824*a* initiates the signal process by utilizing cdma2000 signal (S3).

FIG. 498 illustrates W-CDMA Signal Processor 20824*b* (FIG. 495) of the second embodiment. As described in FIG. 498, W-CDMA Signal Processor 20824*b* includes W-CDMA Signal Processing Software Storage Area 20824*b*1 of which the software program stored therein is described in FIGS. 498*a* and 499 hereinafter.

FIG. 498*a* illustrates the software program stored in W-CDMA Signal Processing Software Storage Area 20824*b*1 (FIG. 498) to send an inquiry signal. Here, the inquiry signal is a W-CDMA signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal. Referring to FIG. 496*a*, W-CDMA Signal Processor 20824*b* (FIG. 498) periodically sends an inquiry signal by utilizing W-CDMA signal via Antenna 218 (FIG. 1).

FIG. 499 illustrates the software program stored in W-CDMA Signal Processing Software Storage Area 20824*b*1 (FIG. 498). Referring to FIG. 499, W-CDMA Signal Processor 20824*b* (FIG. 498) periodically checks the incoming signal received via Antenna 218 (FIG. 1) (S1). If the incoming signal is a response signal utilizing W-CDMA signal (S2), W-CDMA Signal Processor 20824*b* initiates the signal process by utilizing W-CDMA signal (S3).

FIG. 500 illustrates TDS-CDMA Signal Processor 20824*c* (FIG. 495) of the second embodiment. As described in FIG. 500, TDS-CDMA Signal Processor 20824*c* includes TDS-CDMA Signal Processing Software Storage Area 20824*c*1 of which the software program stored therein is described in FIGS. 500*a* and 501 hereinafter.

FIG. 500*a* illustrates the software program stored in TDS-CDMA Signal Processing Software Storage Area 20824*c*1 (FIG. 500) to send an inquiry signal. Here, the inquiry signal is a TDS-CDMA signal sent via Antenna 218 (FIG. 1) to identify the type of signal to be utilized for the signal process. The identification of the type of signal is performed by sending an inquiry signal which requests for a response signal, and identifying the type of the response signal which is sent to Communication Device 200 in response to the inquiry signal.

Referring to FIG. 500*a*, TDS-CDMA Signal Processor 20824*c* (FIG. 500) periodically sends an inquiry signal by utilizing TDS-CDMA signal via Antenna 218 (FIG. 1).

FIG. 501 illustrates the software program stored in TDS-CDMA Signal Processing Software Storage Area 20824*c*1 (FIG. 501). Referring to FIG. 501, TDS-CDMA Signal Processor 20824*c* (FIG. 500) periodically checks the incoming signal received via Antenna 218 (FIG. 1) (S1). If the incoming signal is a response signal utilizing TDS-CDMA signal (S2), TDS-CDMA Signal Processor 20824*c* initiates the signal process by utilizing TDS-CDMA signal (S3).

FIGS. 502 through 503 illustrate the third embodiment to implement the present function by utilizing a minimum amount of hardware circuits.

FIG. 502 illustrates the elements of Signal Processor 208 (FIG. 1). As described in FIG. 502, Signal Processor 208 includes Signal Type Detector 20824*d*, CDMA2000 Signal Processing Software Archive 20824*e*, W-CDMA Signal Processing Software Archive 20824*f*, TDS-CDMA Signal Processing Software Archive 20824*g*, and Signal Processing Work Area 20824*h*. Signal Type Detector 20824*d* is a hardware circuit to detect the type of the signal received via Antenna 218 of which the elements are same as the ones described in FIG. 493. CDMA2000 Signal Processing Software Archive 20824*e* stores the software programs in a compressed format which processes cdma2000 signals. W-CDMA Signal Processing Software Archive 20824*f* stores the software programs in a compressed format which processes W-CDMA signals. TDS-CDMA Signal Processing Software Archive 20824*g* stores the software programs in a compressed format which process TDS-CDMA signals. Signal Processing Work Area 20824*h* is a work area for one or more of the software programs to be executed of which the sequence is described in FIG. 503.

FIG. 502*a* illustrates the software program stored in Signal Type Detecting Software Storage Area 20824*d*1 (FIG. 493) executed by Signal Processing CPU 20824*d*2 (FIG. 493) to send an inquiry signal. Here, the inquiry signal is a signal sent via Antenna 218 (FIG. 1) to identify the type of signal to be utilized for the signal process. Referring to FIG. 502*a*, Signal Processing CPU 20824*d*2 periodically sends inquiry signals by cdma2000 signal, W-CDMA signal, and TDS-CDMA signal via Antenna 218 (FIG. 1).

FIG. 503 illustrates the sequence of Signal Processor 208 (FIG. 1) in the third embodiment. Referring to FIG. 503, Signal Processing CPU 20824*d*2 (FIG. 493) periodically checks the incoming signals received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 unpacks the corresponding software program stored in Signal Processor 208 thereafter (S4). Signal Processing CPU 20824*d*2 executes the unpacked software program to initiate the signal process therewith (S5). For example, If Signal Processing CPU 20824*d*2 identifies that the response signal is a cdma2000 signal, it unpacks the compressed software program stored in CDMA2000 Signal Processing Software Archive 20824*e* (FIG. 502) and initiates the signal process by utilizing Signal Processing Work Area 20824*h* (FIG. 502). If Signal Processing CPU 20824*d*2 identifies that the response signal is a W-CDMA signal, it unpacks the compressed software program stored in W-CDMA Signal Processing Software Archive 20824*f* and initiates the signal process by utilizing Signal Processing Work Area 20824*h*. If Signal Processing CPU 20824*d*2 identifies that the received signal is a TDS-CDMA signal, it unpacks the compressed software program stored in TDS-CDMA Signal Processing Software Archive 20824*g* and initiates the signal process by utilizing Signal Processing Work Area 20824*h*.

FIGS. 504 through 515 illustrate the fourth embodiment to implement the present function by utilizing a hardware circuit for processing cdma2000 signal and utilizing software programs for processing the other types of signals.

FIG. 504 illustrates the elements of Signal Processor 208 (FIG. 1). As described in FIG. 504, Signal Processor 208 includes Signal Type Detector 20824*d*, CDMA2000 Signal Processor 20824*a*, W-CDMA Signal Processing Software Archive 20824*f*, TDS-CDMA Signal Processing Software Archive 20824*g*, and Signal Processing Work Area 20824*h*. Signal Type Detector 20824*d* is a hardware circuit to detect the type of the signal received via Antenna 218 of which the elements are same as the ones described in FIG. 493. CDMA2000 Signal Processor 20824*a* is a hardware circuit to process cdma2000 signals of which the details are described in FIG. 506. W-CDMA Signal Processing Software Archive 20824*f* stores a software program in a compressed format which processes W-CDMA signals. TDS-CDMA Signal Processing Software Archive 20824*g* stores a software program in a compressed format which processes TDS-CDMA signals. Signal Processing Work Area 20824*h* is a work area for one or more of the software programs to be executed of which the sequence is described in FIG. 507.

FIG. 504*a* illustrates the software program stored in Signal Type Detecting Software Storage Area 20824*d*1 (FIG. 493) executed by Signal Processing CPU 20824*d*2 (FIG. 493) to send an inquiry signal. Here, the inquiry signal is a signal sent via Antenna 218 (FIG. 1) to identify the type of signal to be utilized for the signal process. Referring to FIG. 504*a*, Signal Processing CPU 20824*d*2 periodically sends inquiry signals by cdma2000 signal, W-CDMA signal, and TDS-CDMA signal via Antenna 218 (FIG. 1).

FIG. 505 illustrates the software program stored in Signal Type Detecting Software Storage Area 20824*d*1 (FIG. 493) executed by Signal Processing CPU 20824*d*2 (FIG. 493). As described in FIG. 505, Signal Processing CPU 20824*d*2 periodically checks the incoming signal received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 thereafter sets a path to the relevant signal processor (S4). For example, if the identified signal is a cdma2000 signal, Signal Processing CPU 20824*d*2 sets a path to CDMA2000 Signal Processor 20824*a* (FIG. 504) of which the remaining process is described in FIG. 506. If the identified signal is a W-CDMA signal or a TDS-CDMA signal, Signal Processing CPU 20824*d*2 sets a path to Signal Processing Work Area 20824*h* (FIG. 504) of which the remaining process is described in FIG. 507.

FIG. 506 illustrates the sequence of CDMA2000 Signal Processor 20824*a* (FIG. 504). Referring to FIG. 506, CDMA2000 Signal Processor 20824*a* processes cdma2000 signal received from Signal Type Detector 20824*d* (FIG. 504), and converts the cdma2000 signals into CPU readable data. CDMA2000 Signal Processor 20824*a* also converts CPU readable data into cdma signals.

FIG. 507 illustrates the sequence of Signal Processing CPU 20824*d*2 (FIG. 493). Referring to FIG. 507, Signal Processing CPU 20824*d*2 unpacks the corresponding software program stored in Signal Processor 208 (S1), and executes the unpacked software program (S2). The unpacked software program performs the signal process thereafter (S2). For example, if Signal Processing CPU 20824*d*2 identifies that the received signal is a W-CDMA signal in S3 of FIG. 505, it unpacks the compressed software program stored in W-CDMA Signal Processing Software Archive 20824*f* (FIG. 504) and initiates the signal process by utilizing Signal Processing Work Area 20824*h* (FIG. 504). If Signal Processing CPU 20824*d*2 identifies that the received signal is a TDS-CDMA signal in S3 of FIG. 505, it unpacks the compressed software program stored in TDS-CDMA Signal Processing Software Archive 20824*g* (FIG. 504) and initiates the signal process by utilizing Signal Processing Work Area 20824*h*.

FIGS. 508 through 511 illustrate another variation of the fourth embodiment to implement the present function by utilizing a hardware circuit for processing W-CDMA signal and utilizing software programs for processing the other types of signals.

FIG. 508 illustrates the elements of Signal Processor 208 (FIG. 1). As described in FIG. 508, Signal Processor 208 includes Signal Type Detector 20824*d*, W-CDMA Signal Processor 20824*b*, CDMA2000 Signal Processing Software Archive 20824*e*, TDS-CDMA Signal Processing Software Archive 20824*g*, and Signal Processing Work Area 20824*h*. Signal Type Detector 20824*d* is a hardware circuit to detect the type of the signal received via Antenna 218 of which the elements are same as the ones described in FIG. 493. W-CDMA Signal Processor 20824*b* is a hardware circuit to process W-CDMA signals of which the details are described in FIG. 510. CDMA2000 Signal Processing Software Archive 20824*e* stores a software program in a compressed format which processes cdma2000 signals. TDS-CDMA Signal Processing Software Archive 20824*g* stores a software program in a compressed format which processes TDS-CDMA signals. Signal Processing Work Area 20824*h* is a work area for one or more of the software programs to be executed of which the sequence is described in FIG. 511.

FIG. 508*a* illustrates the software program stored in Signal Type Detecting Software Storage Area 20824*d*1 (FIG. 493) executed by Signal Processing CPU 20824*d*2 (FIG. 493) to send an inquiry signal. Here, the inquiry signal is a signal sent via Antenna 218 (FIG. 1) to identify the type of signal to be utilized for the signal process. Referring to FIG. 508*a*, Signal Processing CPU 20824*d*2 periodically sends inquiry signals by cdma2000 signal, W-CDMA signal, and TDS-CDMA signal via Antenna 218 (FIG. 1).

FIG. 509 illustrates the software program stored in Signal Type Detecting Software Storage Area 20824*d*1 (FIG. 493) executed by Signal Processing CPU 20824*d*2 (FIG. 493). As described in FIG. 509, Signal Processing CPU 20824*d*2 periodically checks the incoming signal received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 thereafter sets a path to the relevant signal processor (S4). For example, if the identified signal is a W-CDMA signal, Signal Processing CPU 20824*d*2 sets a path to W-CDMA Signal Processor 20824*b* (FIG. 508) of which the remaining process is described in FIG. 510. If the identified signal is a cdma2000 signal or a TDS-CDMA signal, Signal Processing CPU 20824*d*2 sets a path to Signal Processing Work Area 20824*h* (FIG. 508) of which the remaining process is described in FIG. 511.

FIG. 510 illustrates the sequence of W-CDMA Signal Processor 20824*b* (FIG. 508). Referring to FIG. 510, W-CDMA Signal Processor 20824*b* processes W-CDMA signal received from Signal Type Detector 20824*d* (FIG. 508), and converts the W-CDMA signal into CPU readable data. W-CDMA Signal Processor 20824*b* also converts CPU readable data into cdma signals.

FIG. 511 illustrates the sequence of Signal Processing CPU 20824*d*2 (FIG. 493). Referring to FIG. 511, Signal Processing CPU 20824*d*2 unpacks the corresponding software program stored in Signal Processor 208 (S1), and executes the unpacked software program (S2). The unpacked software program performs the signal process thereafter (S2). For example, if Signal Processing CPU 20824*d*2 identifies that the received signal is a cdma2000 signal in S3 of FIG. 509, it unpacks the compressed software program stored in CDMA2000 Signal Processing Software Archive 20824*e* (FIG. 508) and initiates the signal process by utilizing Signal Processing Work Area 20824*h* (FIG. 508). If Signal Processing CPU 20824*d*2 identifies that the received signal is a TDS-CDMA signal in S3 of FIG. 509, it unpacks the compressed software program stored in TDS-CDMA Signal Processing Software Archive 20824*g* (FIG. 508) and initiates the signal process by utilizing Signal Processing Work Area 20824*h*.

FIGS. 512 through 515 illustrate another variation of the fourth embodiment to implement the present function by utilizing a hardware circuit for processing TDS-CDMA signal and utilizing software programs for processing the other types of signals.

FIG. 512 illustrates the elements of Signal Processor 208 (FIG. 1). As described in FIG. 512, Signal Processor 208 includes Signal Type Detector 20824*d*, TDS-CDMA Signal Processor 20824*c*, CDMA2000 Signal Processing Software Archive 20824*e*, W-CDMA Signal Processing Software Archive 20824*f*, and Signal Processing Work Area 20824*h*. Signal Type Detector 20824*d* is a hardware circuit to detect the type of the signal received via Antenna 218 of which the elements are same as the ones described in FIG. 493. TDS-CDMA Signal Processor 20824*c* is a hardware circuit to process TDS-CDMA signals of which the details are described in FIG. 514. CDMA2000 Signal Processing Software Archive 20824*e* stores a software program in a compressed format which processes cdma2000 signals. W-CDMA Signal Processing Software Archive 20824*f* stores a software program in a compressed format which processes W-CDMA signals. Signal Processing Work Area 20824*h* is a work area for one or more of the software programs to be executed of which the sequence is described in FIG. 515.

FIG. 512*a* illustrates the software program stored in Signal Type Detecting Software Storage Area 20824*d*1 (FIG. 493) executed by Signal Processing CPU 20824*d*2 (FIG. 493) to send an inquiry signal. Here, the inquiry signal is a signal sent via Antenna 218 (FIG. 1) to identify the type of signal to be utilized for the signal process. Referring to FIG. 512*a*, Signal Processing CPU 20824*d*2 periodically sends inquiry signals by cdma2000 signal, W-CDMA signal, and TDS-CDMA signal via Antenna 218 (FIG. 1).

FIG. 513 illustrates the software program stored in Signal Type Detecting Software Storage Area 20824*d*1 (FIG. 493) executed by Signal Processing CPU 20824*d*2 (FIG. 493). As described in FIG. 513, Signal Processing CPU 20824*d*2 periodically checks the incoming signal received via Antenna 218 (FIG. 1) (S1). If an incoming signal is received, Signal Processing CPU 20824*d*2 determines whether the incoming signal is a response signal (S2), and identifies the type of the signal (S3). Signal Processing CPU 20824*d*2 thereafter sets a path to the relevant signal processor (S4). For example, if the identified signal is a TDS-CDMA signal, Signal Processing CPU 20824*d*2 sets a path to TDS-CDMA Signal Processor 20824*c* (FIG. 512) of which the remaining process is described in FIG. 514. If the identified signal is a cdma2000 signal or a W-CDMA signal, Signal Processing CPU **20824*d*2 sets a path to Signal Processing Work Area 20824*h* (FIG. 512) of which the remaining process is described in FIG. 515**.

FIG. 514 illustrates the sequence of TDS-CDMA Signal Processor **20824*c* (FIG. 512). Referring to FIG. 514, TDS-CDMA Signal Processor 20824*c* processes TDS-CDMA signal received from Signal Type Detector 20824*d* (FIG. 512), and converts the W-CDMA signal into CPU readable data. TDS-CDMA Signal Processor 20824*c*** also converts CPU readable data into TDS-CDMA signals.

FIG. 515 illustrates the sequence of Signal Processing CPU **20824*d*2 (FIG. 493). Referring to FIG. 515, Signal Processing CPU 20824*d*2 unpacks the corresponding software program stored in Signal Processor 208 (S1), and executes the unpacked software program (S2). The unpacked software program performs the signal process thereafter (S2). For example, if Signal Processing CPU 20824*d*2 identifies that the received signal is a cdma2000 signal in S3 of FIG. 513, it unpacks the compressed software program stored in CDMA2000 Signal Processing Software Archive 20824*e* (FIG. 512) and initiates the signal process by utilizing Signal Processing Work Area 20824*h* (FIG. 512). If Signal Processing CPU 20824*d*2 identifies that the received signal is a W-CDMA signal in S3 of FIG. 513, it unpacks the compressed software program stored in W-CDMA Signal Processing Software Archive 20824*f* (FIG. 512) and initiates the signal process by utilizing Signal Processing Work Area 20824*h***.

FIGS. 516 through 521 illustrate the method to display on LCD 201 (FIG. 1) the type of signal currently utilized by Signal Processor 208 (FIG. 1).

FIG. 516 illustrates the item(s) displayed on LCD 201 (FIG. 1). As described in FIG. 516, the type of signal currently utilized by Signal Processor 208 (FIG. 1) is displayed on LCD 201. In the example explained in FIG. 516, Message MS5 is displayed if cdma2000 signal is utilized for signal processing by Signal Processor 208, Message MS6 is displayed if W-CDMA signal is utilized for signal processing by Signal Processor 208, and Message MS7 is displayed if TDS-CDMA signal is utilized for signal processing by Signal Processor 208.

FIG. 517 illustrates the information stored in RAM 206 (FIG. 1). As described in FIG. 517, RAM 206 includes Multiple Signal Processing Information Storage Area **20624*a* in which the storage areas included are described in FIG. 518** hereinafter.

FIG. 518 illustrates the storage areas included in Multiple Signal Processing Information Storage Area **20624*a*. As described in FIG. 518, Multiple Signal Processing Information Storage Area 20624*a* includes Multiple Signal Processing Software Storage Area 20624*b* and Multiple Signal Processing Data Storage Area 20624*c*. Multiple Signal Processing Software Storage Area 20624*b* stores the software programs necessary to implement the present function, such as the one described in FIG. 521, and Multiple Signal Processing Data Storage Area 20624*c* stores the data necessary to implement the present function, such as the one described in FIG. 519**.

FIG. 519 illustrates the data stored in Multiple Signal Processing Data Storage Area **20624*c* (FIG. 518). As described in FIG. 519, Multiple Signal Processing Data Storage Area 20624*c* includes Message Data Storage Area 20624*c*1 in which the data stored are explained in FIG. 520** hereinafter.

FIG. 520 illustrates the data stored in Message Data Storage Area **20624*c*1 (FIG. 519). As described in FIG. 520, Message Data Storage Area 20624*c*1 stores Message MS5, Message MS6, and Message MS7. Here, Message MS5 represents the text data indicating the word cdma2000, Message MS6 represents the text data indicating the word W-CDMA, and Message MS7 represents the text data indicating the word TDS-CDMA, all of which are displayed on LCD 201 (FIG. 1) as described in FIG. 516**.

FIG. 521 illustrates the software program store in Multiple Signal Processing Software Storage Area **20624*b* (FIG. 518). Referring to FIG. 521, CPU 211 (FIG. 1) periodically checks the incoming signal received via Antenna 218 (FIG. 1) (S1). If an incoming signal is received, CPU 211 determines the type of the signal (S3). CPU 211 thereafter retrieves from Message Data Storage Area 20624*c*1 and displays the relevant text data on LCD 201 (FIG. 1) (S4). For example, CPU 211 displays Message MS5 if cdma2000 signal is detected. In the like manner, CPU 211 displays Message MS6 if W-CDMA signal is detected and Message MS7 if TDS-CDMA signal is detected. As another embodiment, the detection of the type of the signal utilized for signal processing may be delegated to Signal Processing CPU 20824*d*2 (FIG. 493**).

For the avoidance of doubt, all software programs described hereinbefore to implement the present function may be executed solely by CPU 211 (FIG. 1) or by Signal Processing CPU **20824*d*2 (FIG. 493), or by both CPU 211 and Signal Processing CPU 20824*d*2**.

<<Multiple Signal Processing Function—Simultaneous Multiple Signal Processing Function>>

FIGS. 522 through 529 illustrate the simultaneous multiple signal processing function which enables Communication Device 200 to process with multiple types of signals simultaneously. By utilizing the present function, Communication Device 200 is capable to signal process by utilizing cdma2000 signal, W-CDMA signal, and TDS-CDMA signal simultaneously.

FIG. 522 illustrates the information stored in Multiple Signal Processing Software Storage Area **20624*b* (FIG. 518). As described in FIG. 522, Multiple Signal Processing Software Storage Area 20624*b* includes Simultaneous Multiple Signal Processing Software Storage Area 20624*b*1. Simultaneous Multiple Signal Processing Software Storage Area 20624*b*1 stores the software programs to process cdma2000 signal, W-CDMA signal, and TDS-CDMA signal which are described in FIGS. 523 through 525** hereinafter.

FIG. 523 illustrates the software program stored in Simultaneous Multiple Signal Processing Software Storage Area **20624*b*1 (FIG. 522) to process cdma2000 signal. Referring to FIG. 523, Signal Processing CPU 20824*d*2 (FIG. 493) periodically checks the incoming signal (S1). If the incoming signal is cdma2000 signal of which the signal level exceeds value x (S2), Signal Processing CPU 20824*d*2 initiates the signal process by utilizing cdma2000 signal (S3**).

FIG. 524 illustrates the software program stored in Simultaneous Multiple Signal Processing Software Storage Area **20624*b*1 (FIG. 522) to process W-CDMA signal. Referring to FIG. 524, Signal Processing CPU 20824*d*2 (FIG. 493) periodically checks the incoming signal (S1). If the incoming signal is W-CDMA signal of which the signal level exceeds value x (S2), Signal Processing CPU 20824*d*2 initiates the signal process by utilizing W-CDMA signal (S3**).

FIG. 525 illustrates the software program stored in Simultaneous Multiple Signal Processing Software Storage Area **20624*b*1 (FIG. 522) to process TDS-CDMA signal. Referring to FIG. 525, Signal Processing CPU 20824*d*2 (FIG. 493) periodically checks the incoming signal (S1). If the incoming signal is TDS-CDMA signal of which the signal level exceeds value x (S2), Signal Processing CPU 20824*d2*** initiates the signal process by utilizing TDS-CDMA signal (S3).

FIGS. 526 through 529 illustrate the soft handover process of Communication Device 200 handovering from one type of signal to another type of signal. The current process is implemented when Communication Device 200 is moving from, for example, an area utilizing cdma2000 signal to another area utilizing W-CDMA signal.

FIG. 526 illustrates the storage area included in Multiple Signal Processing Software Storage Area **20624*b* (FIG. 522). As described in FIG. 526, Multiple Signal Processing Software Storage Area 20624*b* includes Soft Handover Processing Software Storage Area 20624*b*2 in which the software programs stored are explained in FIGS. 527 through 529**.

The soft handover process is primarily divided in three parts wherein the first part is described in FIG. 527, the second part is described in FIG. 528, and the third part is described in FIG. 529.

FIG. 527 illustrates the software program stored in Soft Handover Processing Software Storage Area **20624*b*2 (FIG. 527) which implements the first part of the soft handover process. Referring to FIG. 527, Signal Processing CPU 20824*d2* (FIG. 493) periodically checks the status of the incoming signal (S1). If the level of the signal currently utilized (e.g., cdma2000 signal) exceeds the value x, the soft handover process is not initiated and Signal Processing CPU 20824*d2* continues to utilize the type of signal (e.g., cdma2000 signal) for signal processing (S2). If the level of the signal currently utilized (e.g., cdma2000 signal) does not exceed the value x, on the other hand (S2), the soft handover process is initiated of which the details are described in FIG. 528 (S3**).

FIG. 528 illustrates the software program stored in Soft Handover Processing Software Storage Area **20624*b*2 (FIG. 526) which implements the second part of the soft handover process. Referring to FIG. 528, Signal Processing CPU 20824*d2* (FIG. 493) searches for other types of signals to maintain seamless connection (S1). If another type of signal (e.g., W-CDMA signal) of which the signal level exceeds the value y is found (S2), Signal Processing CPU 20824*d2* initiates new connection utilizing such type (e.g., W-CDMA signal) to maintain seamless communication (S3**).

FIG. 529 illustrates the software program stored in Soft Handover Processing Software Storage Area **20624*b*2 (FIG. 527) which implements the third part of the soft handover process. Referring to FIG. 529, Signal Processing CPU 20824*d2* (FIG. 493) periodically checks the current status of the signal level of the type of signal (e.g., cdma2000) which has been utilizing (S1). If the signal level of such type (e.g., cdma2000) still exceeds the value z, Signal Processing CPU 20824*d2* maintains connection utilizing such type of signal (e.g., cdma2000) (S2). Here, Signal Processing CPU 20824*d2* is utilizing two types of signals for the signal process (e.g., cdma2000 and W-CDMA) at this moment. On the other hand, if the signal level of such type (e.g., cdma2000) no longer exceeds the value z, Signal Processing CPU 20824*d2* terminates to maintain connection utilizing such type of signal (e.g., cdma2000) (S3). Signal Processing CPU 20824*d2* utilizes only the signal found in S2 of FIG. 528** for the signal process thereafter.

For the avoidance of doubt, all software programs described hereinbefore to implement the present function may be executed solely by CPU 211 (FIG. 1) or by Signal Processing CPU **20824*d2* (FIG. 493), or by both CPU 211 and Signal Processing CPU 20824*d2***.

As another embodiment, the multiple signal processing function may be utilized for processing other sets of combination of the signals, such as the 2G signal, the 3G signal, and the 4G signal. In order to implement this embodiment, the term 'cdma2000' is substituted by '2G', the term 'W-CDMA' is substituted by '3G', and the term 'TDS-CDMA' is substituted by '4G' in FIGS. 492 through 529 for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA; and the 4G signal may be of any type of signal categorized as 4G.

As another embodiment, the multiple signal processing function may be utilized for processing the first type of 4G signal, the second type of 4G signal, and the third type of 4G signal. In order to implement this embodiment, the term 'cdma2000' is substituted by 'the first type of 4G signal', the term 'W-CDMA' is substituted by 'the second type of 4G signal', and the term 'TDS-CDMA' is substituted by 'the third type of 4G signal' in FIGS. 492 through 529 for purposes of implementing the present embodiment. Here, the first type of 4G signal, the second type of 4G signal, and the third type of 4G signal may be of any type of signal categorized as 4G.

As another embodiment, the multiple signal processing function may be utilized for processing the 2G signal, the first type of 3G signal, and the second type of 3G signal. In order to implement this embodiment, the term 'cdma2000' is substituted by 'the 2G signal', the term 'W-CDMA' is substituted by 'the first type of 3G signal', and the term 'TDS-CDMA' is substituted by 'the second type of 3G signal' in FIGS. 492 through 529 for purposes of implementing the present embodiment. Here, the 2G signal may be of any type of signal categorized as 2G, including, but not limited to cdmaOne, GSM, and D-AMPS; and the first type of 3G signal and the second type of 3G signal may be of any type of signal categorized as 3G, including, but not limited to cdma2000, W-CDMA, and TDS-CDMA.

As another embodiment, the multiple signal processing function may be utilized for processing the first type of 2G signal, the second type of 2G signal, and the 3G signal. In order to implement this embodiment, the term 'cdma2000' is substituted by 'the first type of 2G signal', the term 'W-CDMA' is substituted by 'the second type of 2G signal', and the term 'TDS-CDMA' is substituted by 'the 3G signal' in FIGS. 492 through 529 for purposes of implementing the present embodiment. Here, the first type of 2G signal and the second type of 2G signal may be of any type of signal categorized as 2G, including, but not limited to cdmaOne, GSM, and D-AMPS; and the 3G signal may be of any type of signal categorized as 3G, including, but not limited to cdma2000, W-CDMA, and TDS-CDMA.

In sum, the multiple signal processing function described in FIGS. 492 through 529 maybe utilized for processing any combination of any type of signal.

<<Multiple Signal Processing Function—Summary>>

(1) A communication device comprising an antenna, a signal processor, said signal processor processes a series of wireless signals received from said antenna, said signal processor processes a first signal and a second signal wherein said first signal and said second signal are of different types of signal.

(2) A communication device of the summary (1) wherein said first signal is a cdma2000 signal.

(3) A communication device of the summary (1) wherein said first signal is a W-CDMA signal.

(4) A communication device of the summary (1) wherein said first signal is a TDS-CDMA signal.

(5) A communication device of the summary (1) wherein said communication device further comprises a display wherein said display outputs the type of signal which said signal processor is currently processing.

(6) A communication device of the summary (1) wherein said antenna and said signal processor are capable to process email data.

(7) A communication device of the summary (1) wherein said antenna and said signal processor are capable to process voice communication data.

(8) A communication device of the summary (1) wherein said antenna and said signal processor are capable to process email data and voice communication data.

<<Positioning System—Pin-Pointing Function>>

FIGS. 530 through 553 illustrate the pin-pointing function of positioning system which enables Communication Device 200 to display the accurate location of another wireless communication device in an artificial structure, such as a non-movable structure (e.g., building and house) and a movable structure (e.g., train, airplane, space shuttle, and space station). FIGS. 20*a* through 26 apply to implement the pin-pointing function. An example of Device A displaying the location of Device B is utilized hereinafter wherein both Device A and Device B are Communication Devices 200.

FIG. 530 illustrates a building in which Device B is located. Referring to FIG. 530, Building 25BLD is composed of Basement 25BSM1 (the basement), Floor 25FLR1 (the first floor), Floor 25FLR2 (the second floor), and Floor 25FLR3 (the third floor).

FIG. 531 illustrates the relays installed in each room of Building 25BLD (FIG. 530). Referring to FIG. 531, each Room 25RM of Building 25BLD is installed of a plurality of relays which are utilized for detecting the location of Communication Device 200 by the method so-called 'GPS' as described in FIGS. 20*a* through 26. In the present example, four relays, i.e., R51 through R54 are installed in Room 25RM in the manner described in FIG. 531.

FIG. 532 illustrates the relays installed in each corridor of Building 25BLD (FIG. 530). Referring to FIG. 532, each Corridor 25CRD of Building 25BLD is installed of a plurality of relays which are utilized for detecting the location of Communication Device 200 by the method so-called 'GPS' as described in FIGS. 20*a* through 26. In the present example, nine relays, i.e., R55 through R63 are installed in Corridor 25CRD in the manner described in FIG. 532.

Referring to FIG. 533, the user of Device A selects the display type by utilizing Input Device 210 (FIG. 1) or via voice recognition system. Here, the display type available in the present embodiment are the display type #1 (which displays the area map with the indication of the location of Device B therein as described in FIG. 534), the display type #2 (which displays the building and each floor with the indication of the location of Device B therein as described in FIG. 535), and the display type #3 (which displays the room and the indication of the location of Device B therein as described in FIG. 536). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

FIG. 534 illustrates the method to display an area map describing the area where Device B is located. As described in FIG. 534, Area Map Display Area 20125AMD in which an area map is shown is displayed on LCD 201 (FIG. 1) when a specific key of Input Device 210 is pressed as described in S1 of FIG. 533.

FIG. 535 illustrates the method to display the building and the floor where Device B is located. As described in FIG. 535, Building 25BLD and each floor thereof (e.g., Basement 25BSM1, Floor 25FLR1, Floor 25FLR2, and Floor 25FLR3 in FIG. 530) are displayed on LCD 201 (FIG. 1) when a specific key of Input Device 210 is pressed in the manner described in S2 of FIG. 533. LCD 201 indicates that Device B is located on Floor 25FLR2 (the second floor) of Building 25BLD in the example described in FIG. 535.

FIG. 536 illustrates the method to display the room where Device B is located. As described in FIG. 536, Room 25RM is displayed on LCD 201 (FIG. 1) when a specific key of Input Device 210 (FIG. 1) is pressed in the manner described in S3 of FIG. 533. LCD 201 indicates that Device B is located in Room 25RM and the location therein as described in FIG. 536.

FIGS. 537 through 542 illustrates another embodiment of pin-pointing the location of Device B in a train.

Referring to FIG. 537, Train 25TRN is composed of four cars, i.e., Car 25CR1 (the first car), Car 25CR2 (the second care), Car 25CR3 (the third car), and Car 25CR4 (the fourth car).

FIG. 538 illustrates the relays installed in each car of Train 25TRN (FIG. 537). Taking Car 25CR1 for example, Car 25CR1 is installed of a plurality of relays which are utilized for detecting the existence and the precise location of Communication Device 200 therein by utilizing the method so-called 'GPS' as described in FIGS. 20*a* through 26. In the present example, six relays, i.e., R71 through R76 are installed in Car 25CR1 in the manner described in FIG. 538.

Referring to FIG. 539, the user of Device A selects the display type by utilizing Input Device 210 (FIG. 1) or via voice recognition system in the manner described in FIG. 539. Here, the display type available in the present embodiment are the display type #1 (which displays the area map with the indication of the location of Device B therein as described in FIG. 540), the display type #2 (which displays the main structure of Train 25TRN (FIG. 537) with the indication of the location of Device B therein as described in FIG. 541), and the display type #3 (which displays the car and the indication of the location of Device B therein as described in FIG. 542). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

FIG. 540 illustrates the method to display an area map describing the area where Device B is located. As described in FIG. 540, Area Map Display Area 20125AMD in which an area map is shown is displayed on LCD 201 (FIG. 1) when a specific key of Input Device 210 is pressed as described in S1 of FIG. 539.

FIG. 541 illustrates the method to display the train and the car where Device B is located. As described in FIG. 541, Train 25TRN and each care thereof (e.g., Car 25CR1, Car 25CR2, Car 25CR3, and Car 25CR4) are displayed on LCD 201 (FIG. 1) when a specific key of Input Device 210 is pressed in the manner described in S2 of FIG. 539. LCD 201 indicates that Device B is located in Car 25CR1 (the first car) of Train 25TRN in the example described in FIG. 541.

FIG. 542 illustrates the method to display the car where Device B is located. Assuming that Device B is located in Car 25CR1. As described in FIG. 542, Car 25CR1 is displayed on LCD 201 (FIG. 1) when a specific key of Input Device 210 (FIG. 1) is pressed in the manner described in S3 of FIG. 539.

LCD 201 indicates that Device B is located in Car 25CR1 and the location therein as described in FIG. 542.

FIG. 543 illustrates the information stored in Host Information Storage Area H00*a* (FIG. 429). As described in FIG. 543, Host Information Storage Area H00*a* includes GPS Information Storage Area H25*a* of which the details are described in FIG. 544.

FIG. 544 illustrates the storage areas included in GPS Information Storage Area H25*a* (FIG. 543). As described in FIG. 544, GPS Information Storage Area H25*a* includes GPS Software Storage Area H25*b* and GPS Data Storage Area H25*c*. GPS Software Storage Area H25*b* stores the software programs necessary to implement the present function, such as the one described in FIG. 546. GPS Data Storage Area H25*c* stores the data necessary to implement the present function, such as the one described in FIG. 545.

FIG. 545 illustrates the storage areas included in GPS Data Storage Area H25*c* (FIG. 544). As described in FIG. 545, GPS Data Storage Area H25*c* includes Communication Device Location Data Storage Area H25*c*1, Map Data Storage Area H25*c*2, 3D Map Data Storage Area H25*c*3, Character Data Storage Area H25*c*4, and Relay Location Data Storage Area H25*c*5. Communication Device Location Data Storage Area H25*c*1 stores the location data of Communication Devices 200. Map Data Storage Area H25*c*2 stores a plurality of map data which are designed to be sent to Communication Devices 200. 3D Map Data Storage Area H25*c*3 stores a plurlaity of three-dimensional version of map data corresponding to the map data stored in Map Data Storage Area H25*c*2. Character Data Storage Area H25*c*4 stores various types of character data designed to be displayed on LCD 201 (FIG. 1) of Communication Device 200. Relay Location Data Storage Area H25*c*5 stores the location data of the relays and relating data thereto as described in FIG. 545*a* hereinafter.

FIG. 545*a* illustrates the data stored in Relay Location Data Storage Area H25*c*5 (FIG. 545). Referring to FIG. 545*a*, Relay Location Data Storage Area H25*c*5 stores a plurality of the Relay ID, the Location Data and the Reference Data. The column Relay ID stores identifications assigned to each relay. The column Location Data stores location data in x, y, z format of each relay utilized for calculating the location of Communication Device 200 by the GPS system of which the details are explained in FIGS. 20*a* through 26. The column Reference Data stores identification of each building, floor number, and the room identification in which the relays are installed. Assume that Building 25BLD (FIG. 530) is assigned as 'Building #5', Floor 25FLR3 (FIG. 530) is assigned as 'Floor #3', Room 25RM (FIG. 531) is assigned as 'Room #1', and Corridor 25CRD (FIG. 532) is assigned as 'Corridor #1'. Taking the data described in FIG. 545*a* for example, the Location Data of Relay ID R51 is x51,y51,z51 and its Reference Data is Building #5,Floor #3,Room #1 which means that relay R51 is installed in Room #1 located on Floor #3 of Building #5. In the same manner, the Location Data of Relay ID R52 is x52,y52,z52 and its Reference Data is Building #5,Floor #3,Room #1 which means that relay R52 is installed in Room #1 located on Floor #3 of Building #5; the Location Data of Relay ID R53 is x53,y53,z53 and its Reference Data is Building #5,Floor #3,Room #1 which means that relay R53 is installed in Room #1 located on Floor #3 of Building #5; the Location Data of Relay ID R54 is x54,y54,z54 and its Reference Data is Building #5,Floor #3,Room #1 which means that relay R54 is installed in Room #1 located on Floor #3 of Building #5; the Location Data of Relay ID R55 is x55,y55,z55 and its Reference Data is Building #5,Floor #3,Corridor #1 which means that relay R55 is installed in Corridor #1 located on Floor #3 of Building #5; the Location Data of Relay ID R56 is x56,y56,z56 and its Reference Data is Building #5,Floor #3,Corridor #1 which means that relay R56 is installed in Corridor #1 located on Floor #3 of Building #5; the Location Data of Relay ID R57 is x57,y57,z57 and its Reference Data is Building #5,Floor #3,Corridor #1 which means that relay R57 is installed in Corridor #1 located on Floor #3 of Building #5; the Location Data of Relay ID R58 is x58,y58,z58 and its Reference Data is Building #5,Floor #3,Corridor #1 which means that relay R58 is installed in Corridor #1 located on Floor #3 of Building #5; the Location Data of Relay ID R59 is x59,y59,z59 and its Reference Data is Building #5,Floor #3,Corridor #1 which means that relay R59 is installed in Corridor #1 located on Floor #3 of Building #5; the Location Data of Relay ID R60 is x60,y60,z60 and its Reference Data is Building #5,Floor #3,Corridor #1 which means that relay R60 is installed in Corridor #1 located on Floor #3 of Building #5; the Location Data of Relay ID R61 is x61,y61,z61 and its Reference Data is Building #5,Floor #3,Corridor #1 which means that relay R61 is installed in Corridor #1 located on Floor #3 of Building #5; the Location Data of Relay ID R62 is x62,y62,z62 and its Reference Data is Building #5,Floor #3,Corridor #1 which means that relay R62 is installed in Corridor #1 located on Floor #3 of Building #5; and the Location Data of Relay ID R63 is x63,y63,z63 and its Reference Data is Building #5,Floor #3,Corridor #1 which means that relay R63 is installed in Corridor #1 located on Floor #3 of Building #5.

FIG. 546 illustrates the sequence of the software program stored in GPS Software Storage Area H25*b* (FIG. 544). Assume that Device B is located in Room #1 (Room 25RM (FIG. 531)). Referring to FIG. 546, Host H (FIG. 429) identifies the location of Device B by utilizing the GPS system based on the data received from the relevant relays (S1). In the present example, Host H identifies the location of Device B by calculating the data received from relays R51 through R54. Next, Host H retrieves data from Relay Location Data Storage Area H25*c*5 (FIG. 545*a*) the Relay ID, the Location Data and the Reference Data of the corresponding relays (S2). In the present example, the Relay ID, the Location Data and the Reference Data of relays R51 through R54 are retrieved. Host H then retrieves the map data regarding the surrounding area from Map Data Storage Area H25*c*2 (FIG. 545) and also the corresponding 3D map data from 3D Map Data Storage Area H25*c*3 (FIG. 545) (S3). In the present example, Host H retrieves the map data and the 3D map data of the area surrounding Building 25BLD (FIG. 530). Next, Host H retrieves the character data stored in Character Data Storage Area H25*c*4 (FIG. 545) which are designed to be displayed on LCD 201 (FIG. 1) of Device A (S4). The examples of the character data retrieved by Host H are the image data of Building 25BLD (FIG. 530) and Room 25RM (FIG. 531) as described in FIGS. 535 and 536. The data retrieved in steps S1 through S4 are sent to Device A (S5).

FIG. 547 illustrates the information stored in RAM 206 (FIG. 1) of Device A. As described in FIG. 547, RAM 206 includes GPS Information Storage Area 20625*a* of which the details are described in FIG. 548.

FIG. 548 illustrates the storage areas included in GPS Information Storage Area 20625*a* (FIG. 547). As described in FIG. 548, GPS Information Storage Area 20625*a* includes GPS Software Storage Area 20625*b* and GPS Data Storage Area 20625*c*. GPS Software Storage Area 20625*b* stores the software programs necessary to implement the present function, such as the one described in FIG. 550. GPS Data Storage Area 20625*c* stores the data necessary to implement the present function, such as the one described in FIG. 549.

FIG. 549 illustrates the storage areas included in GPS Data Storage Area 20625c (FIG. 548). As described in FIG. 549, GPS Data Storage Area 20625c includes Communication Device Location Data Storage Area 20625c1, Map Data Storage Area 20625c2, 3D Map Data Storage Area 20625c3, Character Data Storage Area 20625c4, and Relay Location Data Storage Area 20625c5. Communication Device Location Data Storage Area 20625c1 stores location data of Device B which is retrieved in S1 of FIG. 546. Map Data Storage Area 20625c2 stores a map data which is retrieved in S2 of FIG. 546. 3D Map Data Storage Area 20625c3 stores a three-dimensional version of map data corresponding to the map data stored in Map Data Storage Area 20625c2, which is also retrieved in S2 of FIG. 546. Character Data Storage Area 20625c4 stores character data designed to be displayed on LCD 201 (FIG. 1) of Device A which is retrieved in S4 of FIG. 546. Relay Location Data Storage Area 20625c5 stores the location data of the relays and relating data thereto which are retrieved in S2 of FIG. 546.

FIG. 549a illustrates the data stored in Relay Location Data Storage Area 20625c5 (FIG. 549) which are retrieved in S2 of FIG. 546. Referring to FIG. 549a, Relay Location Data Storage Area 20625c5 (FIG. 549) stores a plurality of the Relay ID, the Location Data and the Reference Data. The column Relay ID stores identifications assigned to each relay. The column Location Data stores location data of each relay in x, y, z format utilized for calculating the location of Communication Device 200 by the GPS system of which the details are explained in FIGS. 20a through 26. The column Reference Data stores identification of the building, floor number, and the room identification in which the relays are installed. Assume that Building 25BLD (FIG. 530) is assigned as 'Building #5', Floor 25FLR3 (FIG. 530) is assigned as 'Floor #3', Room 25RM (FIG. 531) is assigned as 'Room #1', and Corridor 25CRD (FIG. 532) is assigned as 'Corridor #1'. Taking the data described in FIG. 549a for example, the Location Data of Relay ID R51 is x51,y51,z51 and its Reference Data is Building #5,Floor #3,Room #1 which means that relay R51 is installed in Room #1 located on Floor #3 of Building #5. In the same manner, the Location Data of Relay ID R52 is x52,y52,z52 and its Reference Data is Building #5,Floor #3,Room #1 which means that relay R52 is installed in Room #1 located on Floor #3 of Building #5; the Location Data of Relay ID R53 is x53,y53,z53 and its Reference Data is Building #5,Floor #3,Room #1 which means that relay R53 is installed in Room #1 located on Floor #3 of Building #5; and the Location Data of Relay ID R54 is x54,y54,z54 and its Reference Data is Building #5,Floor #3,Room #1 which means that relay R54 is installed in Room #1 located on Floor #3 of Building #5.

FIG. 550 illustrates the sequence of the software program stored in GPS Software Storage Area 20625b (FIG. 548) to select the display type. Referring to FIG. 550, the user of Device A selects the display type by utilizing Input Device 210 (FIG. 1) or via voice recognition system in the manner described in FIG. 533. Here, the display type available in the present embodiment are the display type #1 (which displays the area map with the indication of the location of Device B therein as described in FIG. 534), the display type #2 (which displays the building and each floor with the indication of the location of Device B therein as described in FIG. 535), and the display type #3 (which displays the room and the indication of the location of Device B therein as described in FIG. 536) (S1).

FIG. 551 illustrates the sequence of the software program stored in GPS Software Storage Area 20625b (FIG. 548) when display type #1 is selected in S1 of FIG. 550. Referring to FIG. 551, CPU 211 (FIG. 1) retrieves map data from Map Data Storage Area 20625c2 (FIG. 549) (S1). CPU 211 then retrieves the location data of Device B from Communication Device Location Data Storage Area 20625c1 (FIG. 549) (S2). CPU 211 identifies the location of Device B in the retrieved map data (S3). The retrieved map data and the location of Device B therein are displayed on LCD 201 (FIG. 1) as described in FIG. 534 (S4). As another embodiment, a 3D map data may also be displayed. Namely, CPU 211 (FIG. 1) retrieves map data from 3D map data from 3D Map Data Storage Area 20625c3 (FIG. 549) (S1). CPU 211 then retrieves the location data of Device B from Communication Device Location Data Storage Area 20625c1 (FIG. 549) (S2). CPU 211 identifies the location of Device B in the retrieved 3D map data (S3). The retrieved 3D map data and the location of Device B therein are displayed on LCD 201 (FIG. 1) as described in FIG. 534 (S4).

FIG. 552 illustrates the sequence of the software program stored in GPS Software Storage Area 20625b (FIG. 548) when display type #2 is selected in S1 of FIG. 550. Referring to FIG. 552, CPU 211 (FIG. 1) retrieves the character data of Building 25BLD (FIG. 530) from Character Data Storage Area 20625c4 (FIG. 549) (S1). CPU 211 then retrieves the location data of Device B from Communication Device Location Data Storage Area 20625c1 (FIG. 549) (S2). CPU 211 identifies the location of Device B in Building 25BLD (S3). Building 25BLD and the location of Device B therein are displayed on LCD 201 (FIG. 1) as described in FIG. 535 (S4).

FIG. 553 illustrates the sequence of the software program stored in GPS Software Storage Area 20625b (FIG. 548) when display type #3 is selected in S1 of FIG. 550. Referring to FIG. 553, CPU 211 (FIG. 1) retrieves the character data of Room 25RM (FIG. 531) from Character Data Storage Area 20625c4 (FIG. 549) (S1). CPU 211 then retrieves the location data of Device B from Communication Device Location Data Storage Area 20625c1 (FIG. 549) (S2). CPU 211 identifies the location of Device B in Room 25RM (S3). Room 25RM and the location of Device B therein are displayed on LCD 201 (FIG. 1) as described in FIG. 536 (S4).

For the avoidance of doubt, the concept described in FIGS. 543 through 553 is not only applicable to display the location of Device B in a building, but also applicable to display the location thereof in a houst, train, airplane, space shuttle, and/or space station.

<<Positioning System—Pin-Pointing Function Summary>>

(1) A positioning system comprising a plurality of relays, a host, a communication device, a target device, said plurality of relays are installed in an artificial structure, said host identifies the location of said target device located in said artificial structure, said receiver device comprises a display, and said display outputs a character data of said artificial structure with a mark indicating the location of said target device located therein.

(2) A communication device comprising a display, a memory, a CPU, wherein said memory stores a character data of an artificial structure, said memory stores a location data, and said display outputs said character data of said artificial structure with a mark corresponding to said location data.

(3) A positioning system comprising a plurality of relays, a host, said host comprises a memory stored a character data, said plurality of relays are installed in an artificial structure, said host calculates an location data based on data received from said plurality of relays, said host retrieves said character data from said memory, and said host outputs said location data and said character data.

<<Artificial Satellite Host>>

FIG. 554 through 567 illustrate Host H, an artificial satellite, which provides the Internet service to Communication Devices 200. In other words, Host H, by being itself as a gateway to the Internet, enables Communication Devices 200 to access the Internet via Host H.

FIG. 554 illustrates the block diagram of Host H. Referring to FIG. 554, CPU H211 controls and administers the overall function and operation of Host H. CPU H211 utilizes RAM H206 to temporarily store data and/or to perform calculation to perform its function. RAM H206 is also utilized to store a plurality of data and programs necessary to perform the present invention. Video Generator H202 generates analog and/or digital video signals which are displayed on Monitor H201. Sound Generator H205 generates analog and/or digital audio signals that are transferred to Speaker H204. ROM H207 stores the data and programs which are necessary to perform the present invention. Antenna H212 sends and receives communication data, location data, and various types of wireless signals. Signal Processor H208 converts a stream of data produced by CPU H211 into a specific format (for example, data compression) in order to be sent by Antenna H212 in a wireless fashion, and also converts a stream of wireless data received by Antenna H212 into a specific format which is readable by CPU H211. Input signals are input by Input Device H210, such as keyboard, ON/OFF switches, joystick, and the signals are transferred to CPU H211 via Interface H209 and Data Bus H203. Direction Controller H213 controls the direction of Host H under the control and administration of CPU H211. Altitude Controller H214 controls the altitude of Host H under the control and administration of CPU H211. Speed Controller H215 controls the speed of Host H under the control and administration of CPU H211. Angle Controller H216 controls the angle of Host H under the control and administration of CPU H211. GPS Navigation System H217 periodically calculates and identifies the present location of Host H in the actual three-dimensional space by way of utilizing the method so-called GPS or global positioning system as described hereinbefore. Solar Panel H230 converts sunlight to electricity. Battery H231 accumulates electricity produced by Solar Panel H230, and provides electricity to each element of Host H.

FIG. 555 illustrates the storage areas included in RAM H206 (FIG. 554). As described in FIG. 555, RAM H206 includes Account Information Storage Area H20626*a* and Artificial Satellite Operating Information Storage Area H20626*v*. Account Information Storage Area H20626*a* stores the information necessary for Host H (FIG. 554) to provide the Internet service of which the details are described in FIGS. 556 through 559. Artificial Satellite Operating Information Storage Area H20626*v* stores the information necessary for Host H to orbit around the earth as an artificial satellite of which the details are described in FIGS. 560 through 567.

FIG. 556 illustrates the storage areas included in Account Information Storage Area H20626*a* (FIG. 555). As described in FIG. 556, Account Information Storage Area H20626*a* includes Account Software Storage Area H20626*b* and Account Data Storage Area H20626*c*. Account Software Storage Area H20626*b* stores the software programs necessary for Host H (FIG. 554) to provide the Internet service to the users of Communication Devicess 200 of which the details are described in FIGS. 558 and 559. Account Data Storage Area H20626*c* data necessary for Host H to provide the Internet service to the user of Communication Devices 200 of which the details are described in FIG. 557.

FIG. 557 illustrates the data stored in Account Data Storage Area H20626*c* (FIG. 556). As described in FIG. 557, Account Data Storage Area H20626*c* comprises three columns, i.e., User ID, Password, and Hardware ID. User ID is an identification of the user of Communication Device 200, Password is a password set by the user of Communication Device 200, and Hardware ID is an identification of the hardware of Communication Device 200. In the example described in FIG. 557, Account Data Storage Area H20626*c* stores the account data of eight users, i.e., the users of which the User ID are USID#1, USID#2, USID#3, USID#4, USID#5, USID#6, USID#7, and USID#8 more precisely, USID#1 of which the Password is PW#1 and of which the Hardware ID is HID#1; USID#2 of which the Password is PW#2 and of which the Hardware ID is HID#2; USID#3 of which the Password is PW#3 and of which the Hardware ID is HID#3; USID#4 of which the Password is PW#4 and of which the Hardware ID is HID#4; USID#5 of which the Password is PW#5 and of which the Hardware ID is HID#5; USID#6 of which the Password is PW#6 and of which the Hardware ID is HID#6; USID#7 of which the Password is PW#7 and of which the Hardware ID is HID#7; and USID#8 of which the Password is PW#8 and of which the Hardware ID is HID#8.

FIG. 558 illustrates the software program stored in Account Software Storage Area H20626*b* (FIG. 556). Referring to FIG. 558, Host H (FIG. 554) recieves a transferred data from Communication Device 200 via Antenna H218 (FIG. 554) (S1). If the transferred data is a request to access the Internet (S2), CPU H211 retrieves the user ID, password, and hardware ID therefrom (S3). CPU H211 compares the user ID, password, and hardware ID with the ones stored in Account Data Storage Area H20626*c* (FIG. 557) (S4), and if the user ID with the same password and the same hardware ID is found therein (S5), CPU H211 initiates the connection process as described in FIG. 559 (S6).

FIG. 559 illustrates the software program stored in Account Software Storage Area H20626*b* (FIG. 556) to perform the Internet connection. Referring to FIG. 559, CPU H211 (FIG. 554) forwards the data to the Internet received from Communication Device 200 (S1), and forwards the data to Communication Device 200 received from the Internet (S2). The sequence of S1 and S2 is repeated for a plurality of times.

FIG. 560 illustrates the storage areas included in Artificial Satellite Operating Information Storage Area H20626*v* (FIG. 555). As described in FIG. 560, Artificial Satellite Operating Information Storage Area H20626*v* includes Artificial Satellite Operating Software Storage Area H20626*w* and Artificial Satellite Operating Data Storage Area H20626*x*. Artificial Satellite Operating Software Storage Area H20626*w* stores the software programs necessary to for Host H (FIG. 554) to orbit around the earth as an artificial satellite of which the details are described in FIGS. 563 through 567. Artificial Satellite Operating Data Storage Area H20626*x* stores the data necessary for Host H to orbit around the earth as an artificial satellite of which the details are described in FIG. 561.

FIG. 561 illustrates the storage area included in Artificial Satellite Operating Data Storage Area H20626*x* (FIG. 560). As described in FIG. 561, Artificial Satellite Operating Data Storage Area H20626*x* includes Direction Controlling Data Storage Area H20626*x*1, Altitude Controlling Data Storage Area H20626*x*2, Speed Controlling Data Storage Area H20626*x*3, Angle Controlling Data Storage Area H20626*x*4, and GPS Navigation Data Storage Area H20626*x*5. Direction Controlling Data Storage Area H20626*x*1 stores the data necessary to determine the direction of Host H (FIG. 554) while orbitting around the earth. Altitude Controlling Data Storage Area H20626*x*2 stores the data necessary to determine the altitude of Host H while orbitting around the earth. Speed Controlling Data Storage Area H20626*x*3 stores the data necessary to determine the speed of Host H while orbitting around the earth. Angle Controlling Data Storage Area H20626*x*4 stores the data necessary to determine the angle of Host H while orbitting around the earth. GPS Navigation Data Storage Area H20626*x*5 stores the data produced by GPS Navigation System H217 (FIG. 554) of which the details are described in FIG. 562.

FIG. 562 illustrates the data stored in GPS Navigation Data Storage Area H20626*x*5 (FIG. 561). As described in FIG. 562, GPS Navigation Data Storage Area H20626*x*5 stores GPS Navigation Data H26GND which is composed of Current Direction Data H26GND1, Current Altitude Data H26GND2, Current Speed Data H26GND3, and Current Angle Data H26GND4. Current Direction Data H26GND1 represents the current direction to which Host H (FIG. 554) travels, Current Altitude Data H26GND2 represents the current altitude of Host H, Current Speed Data H26GND3 represents the current speed of Host H, and Current Angle Data H26GND4 represents the current angle of Host H.

FIG. 563 illustrates the software program stored in Artificial Satellite Operating Software Storage Area H20626*w* (FIG. 560). Referring to FIG. 563, CPU H211 (FIG. 554) periodically retrieves GPS Navigation Data H26GND (FIG. 562) from GPS Navigation System H217 (FIG. 564) (S1), and stores GPS Navigation Data H26GND to GPS Navigation Data Storage Area H20626*x*5 (FIG. 561) (S2). The sequence of S1 and S2 is performed periodically until a signal indicating otherwise is input to Host H (FIG. 554).

FIG. 564 illustrates the software program stored in Artificial Satellite Operating Software Storage Area H20626*w* (FIG. 560). Referring to FIG. 564, CPU H211 (FIG. 554) retrieves Current Direction Data H26GND1 (FIG. 562) from GPS Navigation Data Storage Area H20626*x*5 (FIG. 561) (S1) and also retrieves Direction Controlling Data from Direction Controlling Data Storage Area H20626*x*1 (FIG. 561) (S2). CPU H211 then compares the two data (S3), and corrects and adjusts the current direction of Host H (FIG. 554) (S4).

FIG. 565 illustrates the software program stored in Artificial Satellite Operating Software Storage Area H20626*w* (FIG. 560). Referring to FIG. 565, CPU H211 (FIG. 554) retrieves Current Altitude Data H26GND2 (FIG. 562) from GPS Navigation Data Storage Area H20626*x*5 (FIG. 561) (S1) and also retrieves Altitude Controlling Data from Altitude Controlling Data Storage Area H20626*x*2 (FIG. 561) (S2). CPU H211 then compares the two data (S3), and corrects and adjusts the current altitude of Host H (FIG. 554) (S4).

FIG. 566 illustrates the software program stored in Artificial Satellite Operating Software Storage Area H20626*w* (FIG. 560). Referring to FIG. 566, CPU H211 (FIG. 554) retrieves Current Speed Data H26GND3 (FIG. 562) from GPS Navigation Data Storage Area H20626*x*5 (FIG. 561) (S1) and also retrieves Speed Controlling Data from Speed Controlling Data Storage Area H20626*x*3 (FIG. 561) (S2). CPU H211 then compares the two data (S3), and corrects and adjusts the current speed of Host H (FIG. 554) (S4).

FIG. 567 illustrates the software program stored in Artificial Satellite Operating Software Storage Area H20626*w* (FIG. 560). Referring to FIG. 567, CPU H211 (FIG. 554) retrieves Current Angle Data H26GND4 (FIG. 562) from GPS Navigation Data Storage Area H20626*x*5 (FIG. 561) (S1) and also retrieves Angle Controlling Data from Angle Controlling Data Storage Area H20626*x*4 (FIG. 561) (S2). CPU H211 then compares the two data (S3), and corrects and adjusts the current angle of Host H (FIG. 554) (S4).

As another embodiment, Host H may carry two CPUs, i.e., the first CPU and the second CPU, and also may carry two RAMs, i.e., the first RAM and the second RAM, wherein the first CPU and the first RAM is assigned to provide the Internet service, and the second CPU and the second RAM is assigned to orbit around the earth.

<<Artificial Satellite Host—Summary>>

An artificial satellite orbitting around the earth wherein said artificial satellite comprises a memory including two storage areas, i.e., an account information storage area and an artificial satellite operating information storage area, said account information storage area stores a plurality of account data, said artificial satellite operating information storage area stores artificial satellite operating data which is necessary to orbit around the earth, said artificial satellite enables a terminal to access the Internet via said artificial satellite while said artificial satellite orbits around the earth by utilizing said artificial satellite operating data stored in said artificial satellite operating information storage area.

<<CCD Bar Code Reader Function—Pattern Matching by Host H>>

FIGS. 568 through 579 illustrate the CCD bar code reader function which enables Communication Device 200 to read bar codes and retrieve alphanumeric data therefrom. Two embodiments are illustrated hereinafter: (1) the CCD bar code reader function implemented by the combination of Host H (FIG. 429) and Communication Device 200, and (2) the CCD bar code reader function implemented solely by Communication Device 200. The first embodiment is described in FIGS. 568 through 574, and the second embodiment is described in FIGS. 575 through 579.

FIG. 568 illustrates the storage area included in Host Information Storage Area H00*a* (FIG. 429). As described in FIG. 568, Host Information Storage Area H00*a* includes CCD Bar Code Reader Information Storage Area H27*a* of which the data stored therein are described in FIG. 569.

FIG. 569 illustrates the storage areas included in CCD Bar Code Reader Information Storage Area H27*a* (FIG. 568). As described in FIG. 569, CCD Bar Code Reader Information Storage Area H27*a* includes CCD Bar Code Reader Data Storage Area H27*b* and CCD Bar Code Reader Software Storage Area H27*c*. CCD Bar Code Reader Data Storage Area H27*b* stores the data necessary to implement the present function such as the ones described in FIGS. 570 and 571. CCD Bar Code Reader Software Storage Area H27*c* stores the software programs necessary to implement the present function such as the ones described in FIGS. 572 through 574.

FIG. 570 illustrates the storages areas included in CCD Bar Code Reader Data Storage Area H27*b* (FIG. 569). As described in FIG. 570, CCD Bar Code Reader Data Storage Area H27*b* includes Bar Code Pattern Data Storage Area H27*b*1 and Bar Code Pattern Data Working Area H27*b*2. Bar Code Pattern Data Storage Area H27*b*1 stores a plurality of bar code pattern data of which the details are described in FIG. 571. Bar Code Pattern Data Working Area H27*b*2 is a work area utilized by Host H (FIG. 429) to implement the present function.

FIG. 571 illustrates the data stored in Bar Code Pattern Data Storage Area H27*b*1 (FIG. 570). As described in FIG. 571, the data stored in Bar Code Pattern Data Storage Area H27*b*1 comprises three columns, i.e., Pattern ID PTI, Pattern Image PTIm, and Corresponding Data CPD. Pattern ID PTI is an identification of Pattern Image PTIm, Pattern Image PTIm is an image data of bar code which is compared with the image data input via CCD Unit 214 (FIG. 1), and Corresponding Data CPD is an alphanumeric data corresponding to Pattern Image PTIm. In the example described in FIG. 571, The pattern ID PTI#1 is an identification of pattern image data PTIm#1 of which the corresponding alphanumeric data is CPD#1; the pattern ID PTI#2 is an identification of pattern image data PTIm#2 of which the corresponding alphanumeric data is CPD#2; the pattern ID PTI#3 is an identification of pattern image data PTIm#3 of which the corresponding alphanumeric data is CPD#3; the pattern ID PTI#4 is an identification of pattern image data PTIm#4 of which the corresponding alphanumeric data is CPD#4; the pattern ID PTI#5 is an identification of pattern image data PTIm#5 of which the corresponding alphanumeric data is CPD#5; the pattern ID PTI#6 is an identification of pattern image data PTIm#6 of which the corresponding alphanumeric data is CPD#6; the pattern ID PTI#7 is an identification of pattern image data PTIm#7 of which the corresponding alphanumeric data is CPD#7; the pattern ID PTI#8 is an identification of pattern image data PTIm#8 of which the corresponding alphanumeric data is CPD#8; the pattern ID PTI#9 is an identification of pattern image data PTIm#9 of which the corresponding alphanumeric data is CPD#9; and the pattern ID PTI#10 is an identification of pattern image data PTIm#10 of which the corresponding alphanumeric data is CPD#10.

FIG. 572 illustrates the sequence to implement the present function. Referring to FIG. 572, CPU 211 (FIG. 1) of Communication Device 200 scans a bar code image data by utilizing CCD Unit 214 (FIG. 1) (S1). CPU 211 then sends the bar code image data via Antenna 218 (FIG. 1) (S2). By the execution of CCD Bar Code Reader Software Storage Area H27*c* (FIG. 569), the bar code image is received by Host H (FIG. 429) (S3).

FIG. 573 illustrates the software program stored in CCD Bar Code Reader Software Storage Area H27*c* (FIG. 569). Referring to FIG. 573, Host H (FIG. 429) compares the bar code image data received from Communication Device 200 in S3 of FIG. 573 with the Pattern Images PTIm stored in Bar Code Pattern Data Storage Area H27*b*1 (FIG. 571) (S1). If the received bar code image data matches with one of the Pattern Images PTIm stored therein (S2), Host H retrieves Corresponding Data CPD which corresponds to the Pattern Image PTIm matched in S2 (S3). Host H utilizes Bar Code Pattern Data Working Area H27*b*2 as a work area for processing the foregoing steps S1 through S3.

FIG. 574 illustrates the sequence to implement the present function. Referring to FIG. 574, Host H (FIG. 429) sends Corresponding Data CPD, under the control of the software program stored in CCD Bar Code Reader Software Storage Area H27*c* (FIG. 569), which is retrieved in S3 of FIG. 573 (S1). Communication Device 200 receives Corresponding Data CPD via Antenna 218 (FIG. 1) and stores the data in a specific area of RAM 206 (FIG. 1) (S2). CPU 211 (FIG. 1) of Communication Device 200 processes with Corresponding Data CPD (e.g., display Corresponding Data CPD on LCD 201 (FIG. 1)) (S3).

<<CCD Bar Code Reader Function—Pattern Matching by Com. Device 200>>

FIGS. 575 through 579 illustrates the second embodiment wherein the CCD bar code reader function implemented solely by Communication Device 200.

The data and software programs necessary to implement the present function are downloaded to Communication Device 200 from Host H (FIG. 429) in the manner described in FIGS. 401 through 407.

FIG. 575 illustrates the storage area included in RAM 206 (FIG. 1). As described in FIG. 575, RAM 206 includes CCD Bar Code Reader Information Storage Area 20627*a* of which the information stored therein is downloaded from Host H (FIG. 429). The details of which is described in FIG. 576.

FIG. 576 illustrates the storage areas included in CCD Bar Code Reader Information Storage Area 20627*a* (FIG. 575). As described in FIG. 576, CCD Bar Code Reader Information Storage Area 20627*a* includes CCD Bar Code Reader Data Storage Area 20627*b* and CCD Bar Code Reader Software Storage Area 20627*c*. CCD Bar Code Reader Data Storage Area 20627*b* stores the data necessary to implement the present function such as the ones described in FIGS. 577 and 578. CCD Bar Code Reader Software Storage Area 20627*c* stores the software programs necessary to implement the present function such as the one described in FIG. 579.

FIG. 577 illustrates the storages areas included in CCD Bar Code Reader Data Storage Area 20627*b* (FIG. 576). As described in FIG. 577, CCD Bar Code Reader Data Storage Area 20627*b* includes Bar Code Pattern Data Storage Area 20627*b*1 and Bar Code Pattern Data Working Area 20627*b*2. Bar Code Pattern Data Storage Area 20627*b*1 stores a plurality of bar code pattern data of which the details are described in FIG. 578. Bar Code Pattern Data Working Area 20627*b*2 is a work area utilized by CPU 211 (FIG. 1) to implement the present function.

FIG. 578 illustrates the data stored in Bar Code Pattern Data Storage Area 20627*b*1 (FIG. 577). As described in FIG. 578, the data stored in Bar Code Pattern Data Storage Area 20627*b*1 comprises three columns, i.e., Pattern ID PTI, Pattern Image PTIm, and Corresponding Data CPD. Pattern ID PTI is an identification of Pattern Image PTIm, Pattern Image PTIm is an image data of bar code which is compared with the image data input via CCD Unit 214 (FIG. 1) of which the details are described hereinafter, and Corresponding Data CPD is an alphanumeric data corresponding to Pattern Image PTIm. In the example described in FIG. 578, The pattern ID PTI#1 is an identification of pattern image data PTIm#1 of which the corresponding alphanumeric data is CPD#1; the pattern ID PTI#2 is an identification of pattern image data PTIm#2 of which the corresponding alphanumeric data is CPD#2; the pattern ID PTI#3 is an identification of pattern image data PTIm#3 of which the corresponding alphanumeric data is CPD#3; the pattern ID PTI#4 is an identification of pattern image data PTIm#4 of which the corresponding alphanumeric data is CPD#4; the pattern ID PTI#5 is an identification of pattern image data PTIm#5 of which the corresponding alphanumeric data is CPD#5; the pattern ID PTI#6 is an identification of pattern image data PTIm#6 of which the corresponding alphanumeric data is CPD#6; the pattern ID PTI#7 is an identification of pattern image data PTIm#7 of which the corresponding alphanumeric data is CPD#7; the pattern ID PTI#8 is an identification of pattern image data PTIm#8 of which the corresponding alphanumeric data is CPD#8; the pattern ID PTI#9 is an identification of pattern image data PTIm#9 of which the corresponding alphanumeric data is CPD#9; and the pattern ID PTI#10 is an identification of pattern image data PTIm#10 of which the corresponding alphanumeric data is CPD#10. Basically, the data stored in Bar Code Pattern Data Storage Area 20627*b*1 is identical to the ones stored in Bar Code Pattern Data Storage Area H27*b*1 (FIG. 571) of Host H (FIG. 429).

FIG. 579 illustrates the software program stored in CCD Bar Code Reader Software Storage Area 20627*c* (FIG. 576). Referring to FIG. 579, CPU 211 (FIG. 1) of Communication Device 200 scans a bar code image data by utilizing CCD Unit 214 (FIG. 1) (S1). CPU 211 then compares the bar code image data input via CCD Unit 214 with the Pattern Images PTIm stored in Bar Code Pattern Data Storage Area 20627*b*1

(FIG. 578). If the received bar code image data matches with one of the Pattern Images PTIm stored therein (S2), CPU 211 retrieves Corresponding Data CPD which corresponds to the Pattern Image PTIm matched in S2 (S3). CPU 211 (FIG. 1) processes with Corresponding Data CPD (e.g., display Corresponding Data CPD on LCD 201 (FIG. 1)) (S4). CPU 211 utilizes Bar Code Pattern Data Working Area H27b2 as a work area for processing the foregoing steps S1 through S4.

<<CCD Bar Code Reader Function—Summary>>

(1) A communication device comprising a microphone, a speaker, a CCD camera, a CPU and a multiple mode implementor which implements a voice communication mode and a CCD bar code reader mode, wherein a series of audio data are input to and output from said microphone and said speaker respectively when said voice communication mode is implemented, and said CCD camera inputs a bar code image data and said CPU processes with a corresponding data of said bar code image data when said CCD bar code reader mode is implemented.

(2) Said communication device of summary (1), wherein said corresponding data is an alphanumeric data.

(3) Said communication device of summary (1), wherein said CPU processes with said corresponding data received from a host computer.

(4) Said communication device of summary (1), wherein said communication device further comprises a memory from which said corresponding data is retrieved.

<<Online Renting Function>>

FIGS. 580 through 633 illustrate the online renting function which enables the user of Communication Device 200 to download from Host H (FIG. 429) and rent digital information for a certain period of time.

<<Online Renting Function—Host H>>

FIGS. 580 through 589 illustrate the data and software programs stored in Host H (FIG. 429).

FIG. 580 illustrates the information stored in Host Information Storage Area H00a (FIG. 429). As described in FIG. 580, Host Information Storage Area H00a includes Online Renting Information Storage Area H28a of which the details are described in FIG. 581.

FIG. 581 illustrates the storage areas included in Online Renting Information Storage Area H28a (FIG. 580). As described in FIG. 581, Online Renting Information Storage Area H28a includes Online Renting Data Storage Area H28b and Online Renting Software Storage Area H28c. Online Renting Data Storage Area H28b stores the data necessary to implement the present function, such as the ones described in FIGS. 582 through 588. Online Renting Software Storage Area H28c stores the software program such as the ones described in FIG. 589.

FIG. 582 illustrates the storage areas included in Online Renting Data Storage Area H28b (FIG. 581). As described in FIG. 582, Online Renting Data Storage Area H28b includes Digital Information Storage Area H28b1 and Registration Data Storage Area H28b2. Digital Information Storage Area H28b1 stores various types of digital information, such as songs, video games, word processing softwares, and movies as described hereinafter. Registration Data Storage Area H28b2 stores the data regarding the payment status of the monthly fee of each user of Communication Device 200 as described in FIG. 588.

FIG. 583 illustrates the storage areas included in Digital Information Storage Area H28b1 (FIG. 582). As described in FIG. 583, Digital Information Storage Area H28b1 includes Song Information Storage Area H28b1a, Game Information Storage Area H28b1b, Word Information Storage Area H28b1c, and Movie Information Storage Area H28b1d. The data stored in Song Information Storage Area H28b1a are described in FIG. 584. The data stored in Game Information Storage Area H28b1b are described in FIG. 585. The data stored in Word Information Storage Area H28b1c are described in FIG. 586. The data stored in Movie Information Storage Area H28b1d are described in FIG. 587. The data stored in Digital Information Storage Area H28b1 are downloaded and performed by Communication Device 200 for a certain period of time as described hereinafter.

FIG. 584 illustrates the data stored in Song Information Storage Area H28b1a (FIG. 583). As described in FIG. 584, Song Information Storage Area H28b1a stores Song A H28b1a1, Song B H28b1a2, and Song C H28b1a3. Song A H28b1a1, Song B H28b1a2, and Song C H28b1a3 are song and/or music data which are designed to be output from Speaker 216 (FIG. 1) of Communication Device 200. The data stored in Song Information Storage Area H28b1a are also capable to be output from any type of speakers of any type of personal computers.

FIG. 585 illustrates the data stored in Game Information Storage Area H28b1b (FIG. 583). As described in FIG. 585, Game Information Storage Area H28b1b stores Game A H28b1b1, Game B H28b1b2, and Game C H28b1b3. Game A H28b1b1, Game B H28b1b2, and Game C H28b1b3 are video game programs which are designed to be executed by Communication Device 200 and which display video game objects on LCD 201 (FIG. 1) manipulable by utilizing Input Device 210 (FIG. 1) or via voice recognition system. Shooting video game described in FIG. 270 and driving video game described in FIG. 284 are the examples of the video game programs stored in Game Information Storage Area H28b1b. The video game programs stored in Game Information Storage Area H28b1b are also capable to be executed by any type of personal computers.

FIG. 586 illustrates the data stored in Word Information Storage Area H28b1c (FIG. 583). As described in FIG. 586, Word Information Storage Area H28b1c stores Word Processor A H28b1c1, Word Processor B H28b1c2, and Word Processor C H28b1c3. Word Processor A H28b1c1, Word Processor B H28b1c2, and Word Processor C H28b1c3 are word processing software programs designed to be executed by Communication Device 200 to type a plurality of alphanumeric data by utilizing Input Device 210 (FIG. 1) or via voice recognition system. 'Microsoft Word 2000' and 'Corel Word Perfect' are the examples of the word processing software programs stored in Word Information Storage Area H28b1c. The word processing software programs stored in Word Information Storage Area H28b1c are also capable to be executed by any type of personal computers.

FIG. 587 illustrates the data stored in Movie Information Storage Area H28b1d (FIG. 583). As described in FIG. 587, Movie Information Storage Area H28b1d stores Movie A H28b1d1, Movie B H28b1d2, and Movie C H28b1d3. Movie A H28b1d1, Movie B H28b1d2, and Movie C H28b1d3 are movie programs designed to be executed by Communication Device 200 to output video data from LCD 201 (FIG. 1) and audio data from Speaker 216 (FIG. 1). 'Titanic' and 'Star Wars' are the examples of the movie programs stored in Movie Information Storage Area H28b1d. Soap operas, situation comedies, news, and any type of TV programs are categorized as movie programs for purposes of implementing the present function. Soap operas, situation comedies, news, and any type of TV programs, as another embodiment, may be classified as different categories to implement the present function. The movie programs stored in Movie Information Storage Area H28b1d are also capable to be executed by any type of personal computers.

FIG. 588 illustrates the data stored in Registration Data Storage Area H28*b*2 (FIG. 582) which is utilized in the embodiment described in FIGS. 615 and 616 (Flat Rate). As described in FIG. 588, Registration Data Storage Area H28*b*2 stores the data regarding the payment status of each user of Communication Device 200, which is composed by two columns, i.e., User ID and Status. Here, User ID is an identification of a user of Communication Device 200 and Status represents the payment status of the monthly fee of the user. The single digit '1' represents that the corresponding user has payed the monthly fee of the current month, and the single digit '0' represents that the corresponding user has not yet payed the monthly fee of the current month. In the example described in FIG. 588, the user whose User ID is 'User #1' has paid the monthly fee of the current month ('1'), the user whose User ID is 'User #2' has paid the monthly fee of the current month ('1'), the user whose User ID is 'User #3' has not yet paid the monthly fee of the current month ('0'), and the user whose User ID is 'User #4' has paid the monthly fee of the current month ('1').

FIG. 589 illustrates the storage areas included in Online Renting Software Storage Area H28*c* (FIG. 581). As described in FIG. 589, Online Renting Software Storage Area H28*c* includes Users' Status Checking Software Storage Area H28*c*1 and Administration Software Storage Area H28*c*2. Users' Status Checking Software Storage Area H28*c*1 stores a software program which checks and updates the payment status of the monthly fee of the current month of the users of Communication Device 200 of which the sequence is described in FIG. 590. Administration Software Storage Area H28*c*2 stores Administration Software H28ADS which is designed to be downloaded and executed by Communication Device 200 to implement the present function of which the details are described hereinafter.

FIG. 590 illustrates the software program stored in Users' Status Checking Software Storage Area H82*c*1 (FIG. 589). As described in FIG. 590, Host H (FIG. 429) checks each user's payment status (S1). This checking process is performed on a specific date of each month. If the monthly fee is paid (S2), the positive flag 1 is registered in the column 'Status' of the corresponding User ID (S4*b*). Even if the monthly fee is not paid on time (S2), the present function is still implemented so long as the monthly fee is paid within the grace period. Therefore, if the grace period has passed and the monthly fee is not yet paid (S3), the negative flag 0 is registered in the column 'Status' of the corresponding User ID (S4*a*).

The data and software programs necessary to implement the present function are downloaded to Communication Device 200 from Host H (FIG. 429) in the manner described in FIGS. 401 through 407.

<<Online Renting Function—Com. Device 200>>

FIGS. 591 through 619 illustrate the data and software programs stored in Communication Device 200 to implement the present function.

FIG. 591 illustrates the storage area included in RAM 206 (FIG. 1). As described in FIG. 591, RAM 206 includes Online Renting Information Storage Area 20628*a* of which the details are described in FIG. 592.

FIG. 592 illustrates the storage areas included in Online Renting Information Storage Area 20628*a* (FIG. 591). As described in FIG. 592, Online Renting Information Storage Area 20628*a* includes Online Renting Data Storage Area 20628*b* and Online Renting Software Storage Area 20628*c*. Online Renting Data Storage Area 20628*b* stores the data necessary to implement the present function, such as the ones described in FIGS. 593 through 598. Online Renting Software Storage Area 20628*c* stores the software program such as the one described in FIG. 599.

FIG. 593 illustrates the storage area included in Online Renting Data Storage Area 20628*b* (FIG. 592). As described in FIG. 593, Online Renting Data Storage Area 20628*b* includes Digital Information Storage Area 20628*b*1. Digital Information Storage Area 20628*b*1 stores various types of digital information downloaded from Host H (FIG. 429) for renting purposes for a certain period of time, such as songs, video games, word processing softwares, and movies as described hereinafter.

FIG. 594 illustrates the storage areas included in Digital Information Storage Area 20628*b*1 (FIG. 593). As described in FIG. 594, Digital Information Storage Area 20628*b*1 includes Song Information Storage Area 20628*b*1*a*, Game Information Storage Area 20628*b*1*b*, Word Information Storage Area 20628*b*1*c*, and Movie Information Storage Area 20628*b*1*d*. The data stored in Song Information Storage Area 20628*b*1*a* are described in FIG. 595. The data stored in Game Information Storage Area 20628*b*1*b* are described in FIG. 596. The data stored in Word Information Storage Area 20628*b*1*c* are described in FIG. 597. The data stored in Movie Information Storage Area 20628*b*1*d* are described in FIG. 598. Digital Information Storage Area 20628*b*1 primarily stores the information downloaded from Host H (FIG. 429), however, the data stored in Digital Information Storage Area 20628*b*1 of Communication Device 200 are not necessarily identical to the ones stored in Digital Information Storage Area H28*b*1 (FIG. 583) of Host H.

FIG. 595 illustrates the data stored in Song Information Storage Area 20628*b*1*a* (FIG. 594). In the example described in FIG. 595, Song Information Storage Area 20628*b*1*a* stores Song A 20628*b*1*a*1, Song B 20628*b*1*a*2, and Song C 20628*b*1*a*3 downloaded from Host H (FIG. 429). Song A 20628*b*1*a*1, Song B 20628*b*1*a*2, and Song C 20628*b*1*a*3 are song and/or music data which are designed to be output from Speaker 216 (FIG. 1) of Communication Device 200. The data stored in Song Information Storage Area 20628*b*1*a* are also capable to be output from any type of speakers of any type of personal computers.

FIG. 596 illustrates the data stored in Game Information Storage Area 20628*b*1*b* (FIG. 594). In the example described in FIG. 596, Game Information Storage Area 20628*b*1*b* stores Game A 20628*b*1*b*1, Game B 20628*b*1*b*2, and Game C 20628*b*1*b*3 downloaded from Host H (FIG. 429). Game A 20628*b*1*b*1, Game B 20628*b*1*b*2, and Game C 20628*b*1*b*3 are video game programs which are designed to be executed by Communication Device 200 and which display video game objects on LCD 201 (FIG. 1) manipulable by utilizing Input Device 210 (FIG. 1) or via voice recognition system. Shooting video game described in FIG. 270 and driving video game described in FIG. 284 are the examples of the video game programs stored in Game Information Storage Area 20628*b*1*b*. The video game programs stored in Game Information Storage Area 20628*b*1*b* are also capable to be executed by any type of personal computers.

FIG. 597 illustrates the data stored in Word Information Storage Area 20628*b*1*c* (FIG. 594). In the example described in FIG. 597, Word Information Storage Area 20628*b*1*c* stores Word Processor A 20628*b*1*c*1, Word Processor B 20628*b*1*c*2, and Word Processor C 20628*b*1*c*3 downloaded from Host H (FIG. 429). Word Processor A 20628*b*1*c*1, Word Processor B 20628*b*1*c*2, and Word Processor C 20628*b*1*c*3 are word processing software programs designed to be executed by Communication Device 200 to type a plurality of alphanumeric data by utilizing Input Device 210 (FIG. 1) or via voice recognition system. 'Microsoft Word 2000' and 'Corel Word Perfect' are the examples of the word processing software programs stored in Word Information Storage Area 20628*b*1*c*. The word processing software programs stored in Word Information Storage Area 20628*b*1*c* are also capable to be executed by any type of personal computers.

FIG. 598 illustrates the data stored in Movie Information Storage Area 20628*b*1*d* (FIG. 594). In the example described in FIG. 598, Movie Information Storage Area 20628*b*1*d* stores Movie A 20628*b*1*d*1, Movie B 20628*b*1*d*2, and Movie C 20628*b*1*d*3 downloaded from Host H (FIG. 429). Movie A 20628*b*1*d*1, Movie B 20628*b*1*d*2, and Movie C 20628*b*1*d*3 are movie programs designed to be executed by Communication Device 200 to output video data from LCD 201 (FIG. 1) and audio data from Speaker 216 (FIG. 1). 'Titanic' and 'Star Wars' are the examples of the movie programs stored in Movie Information Storage Area 20628*b*1*d*. Soap operas, situation comedies, news, and any type of TV programs, the present example, are categorized as movie programs for purposes of implementing the present function. Soap operas, situation comedies, news, and any type of TV programs, as another embodiment, may be classified as different categories to implement the present function. The movie programs stored in Movie Information Storage Area 20628*b*1*d* are also capable to be executed by any type of personal computers.

FIG. 599 illustrates the storage areas included in Online Renting Software Storage Area 20628*c* (FIG. 592). As described in FIG. 599, Online Renting Software Storage Area 20628*c* includes Administration Software Storage Area 20628*c*2. Administration Software Storage Area 20628*c*2 stores Administration Software 20628ADS which is downloaded from Host H (FIG. 429) and executed by CPU 211 (FIG. 1) to implement the present function of which the details are described hereinafter.

FIG. 600 illustrates the sequence of display shown on LCD 201 (FIG. 1). In response to the input signal generated by utilizing Input Device 210 (FIG. 1) or via voice recognition system, a list of digital information, such as songs (Song A, Song B, and Song C in the present example) which are to be rented, are displayed on LCD 201 (S1). The list displayed on LCD 201 are the list of the digital information stored in Digital Information Storage Area H28*b*1 (FIG. 583) of Host H (FIG. 429). Taking songs for an example, once the user of Communication Device 200 selects a song which he/she prefers via Input Device 210, he/she now selects the period of time which he/she desires to rent the song. As described in S2 of FIG. 5, the user selects from d. 1 day or e. 1 week or he/she can input a specified period of time (e.g., 10 days) in column f. to specify the rental period by utilizing Input Device 210 or via voice recognition system. The total amount charged is displayed thereafter (S3). Next, the user of Communication Device 200 chooses the payment method from the three choices, i.e., f. credit card, g. money order, or h. personal check (S4). Once the sequence explained from S1 to S4 is completed, the download phase is initiated. Namely, the user selects the directory where he desires to store the digital information (S5) (not to mention, the directory may be automatically designated and therefore omit S5). Once the user chooses the directory, the downloading process is initiated (S6).

FIG. 601 illustrates the sequence of Administration Software 20628ADS stored in Administration Software Storage Area 20628*c*2 (FIG. 599) to perform the sequence described in FIG. 600. In response to the input signal generated by utilizing Input Device 210 (FIG. 1) or via voice recognition system, and by the operation of the Administration Software 20628ADS downloaded from Host H (FIG. 429), a list of digital information stored in Digital Information Storage Area H28*b*1 (FIG. 583) is downloaded from Host H and shown on LCD 201 as described in S1 of FIG. 600 (S1). Then one of the digital information is selected by utilizing Input Device 210 or via voice recognition system, which is transferred to CPU 211 (FIG. 1) via Data Bus 203 (FIG. 1) (S2). The rental period is selected by the same manner (S3). If the user chooses either d. 1 day or e. 1 week in S2 of FIG. 600, CPU 211 reads the data regarding the amount charged from a specific area of RAM 206 (FIG. 1) (S4). Alternatively, if the user chooses f. (in S2 of FIG. 600) and inputs a desired figure, CPU 211 retrieves from a specific area of RAM 206 or calculates the amount charged and displays it on LCD 201 as described in S3 of FIG. 600 (S4). S4 is described in details in FIG. 601*a* hereinafter. Next, the payment method is selected by utilizing Input Device 210 or via voice recognition system, which is transferred to CPU 211 via Data Bus 203 (S5). Once the directory to store the digital information is selected (S6), CPU 211 sends the information regarding the title of the digital information, term (i.e., rental period), and the payment method to Host H (S7). When Host H receives the information from Communication Device 200, Host H transfers the selected digital information in return, and the downloading process is initiated (S8).

FIG. 601*a* illustrates S4 of FIG. 601 in details. Referring to FIG. 601*a*, if the user chooses either d. 1 day or e. 1 week in S2 of FIG. 600 (S1*a*), CPU 211 (FIG. 1) reads the data regarding the amount charged from RAM 206 (S2*a*), and displays the amount on LCD 201 (FIG. 1) (S3). Alternatively, if the user chooses f. (in S2 of FIG. 600) and inputs a desired figure (S1*b*), CPU 211 calculates the amount (S2*b*) and displays the amount on LCD 201 (S3).

FIG. 602 illustrates another embodiment of Administration Software 20628ADS which is an improved version of the one described in FIG. 601. In response to the input signal generated by utilizing Input Device 210 (FIG. 1) or via voice recognition system, and by the operation of the Administration Software 20628ADS stored in Administration Software Storage Area 20628*c*2 (FIG. 599) downloaded from Host H (FIG. 429), a list of digital information stored in Digital Information Storage Area H28*b*1 (FIG. 583) is downloaded from Host H (S1). Then one of the titles is selected by the input signal input by utilizing Input Device 210 or via voice recognition system, which is transferred to CPU 211 (FIG. 1) via Data Bus 203 (FIG. 1) (S2). The rental period is selected by the same manner (S3). S2 and S3 are repeated if the user chooses to rent more than one title (S3*a*). If the user chooses either d. 1 day or e. 1 week in S2 of FIG. 600, CPU 211 reads the data regarding the amount charged from a specific area of RAM 206 (FIG. 1) (S4). Alternatively, if the user chooses f. (in S2 of FIG. 600) and inputs a desired figure, CPU 211 calculates the amount and displays the amount on LCD 201 (FIG. 1) (S4). S4 is further described in FIG. 601*a* hereinbefore. Next, the payment method is selected by the input signal input by utilizing Input Device 210 or via voice recognition system, which is transferred to CPU 211 via Data Bus 203 (S5). Once the directory to store the digital information is selected (S6), CPU 211 sends the information regarding the title, term (i.e., rental period), payment method to Host H (S7). When Host H receives the information from Communication Device 200, Host H transfers the digital information in return, and the downloading process is initiated (S8).

FIG. 603 illustrates the sequence of displays shown on LCD 201 (FIG. 1) when the expiration date (time) is coming close. In the present embodiment, a reminder is shown at the right-hand corner of the screen which indicates that the license will be expired within three days (S1). Reminders will also be shown, in the preferred embodiment of the present invention, at the same position six hours and five minutes before the license expires (S2 and S3). Whenever the reminder is displayed on LCD 201, the user of Communication Device 200 has an option to extend the license. In the present example, the user can extend the license by choosing Yes shown on LCD 201 (S4). If the user chooses not to extend the license, the display in S5*b* is shown. Instead if the user chooses to extend the license, the user is prompted as to the period of time the license is to be extended (S5*a*). The user can also input a desired extended time (e.g., 10 days) in column c. (S5*a*). The total amount charged is displayed thereafter (S6). The user chooses the payment method from the three choices, i.e., 1. credit card, 2. money order, or 3. personal check (S7), and a message of the extended period of time is displayed on LCD 201 (S8).

FIG. 604 illustrates the sequence of Administration Software 20628ADS stored in Administration Software Storage Area 20628*c*2 (FIG. 599) to perform the sequence described in FIG. 603. In response to the input signal generated by utilizing Input Device 210 (FIG. 1) or via voice recognition system, and by the operation of the Administration Software 20628ADS downloaded from Host H (FIG. 429), a timer is set and the expiration date/time is stored in Online Renting Data Storage Area 20628*b* (FIG. 592) (S1). Periodically the expiration date/time is compared with the current date/time (S2). Depending on the difference between the two figures calculated in S2, CPU 211 displays different reminders on LCD 201 as explained in S1 through S3 of FIG. 603.

FIG. 605 illustrates the sequence of Administration Software 20628ADS stored in Administration Software Storage Area 20628*c*2 (FIG. 599). Referring to FIG. 605, when CPU 211 (FIG. 1) displays a reminder as described in S4 of FIG. 603, it displays a prompt to extend the license as described in S4 of FIG. 603 (S1). If CPU 211 receives an input signal from the Input Device 210 (FIG. 1) or via voice recognition system indicating that the license is not going to be extended (S2), a certain message is displayed as shown in S5*b* of FIG. 603 (S7). Alternatively, if the license is extended (S2), the data regarding the extended period input by utilizing Input Device 210 or via voice recognition system is transferred to CPU 211 via Data Bus 203 (S3). If the user chooses either 1. 1 day or 2. 1 week in S5*a* of FIG. 603, CPU 211 reads the data regarding the amount charged from a specific area of RAM 206 (S4). Alternatively, if the user chooses 3. in S5*a* of FIG. 603 and inputs a desired figure, CPU 211 calculates and displays the amount on LCD 201 as described in S6 of FIG. 603 (S4). Next, the payment method is selected by utilizing Input Device 210 or via voice recognition system, and the data regarding the payment method is transferred to CPU 211 via Data Bus 203 (S5). CPU 211 sends the information regarding the extension, and when Host H (FIG. 429) receives the information from Communication Device 200, Host H transfers the permission data, which indicates that the license is extended and a message is displayed as described in S8 of FIG. 603 (S6).

FIG. 606 illustrates the first type of data stream sent from Host H (FIG. 429) to Communication Device 200 during the downloading process described in S8 of FIG. 601 and in S8 of FIG. 602. As described in FIG. 606, Data Stream H28DTSTM1 is composed of Audio Data H28DTSTM1*a*, Video Data H28DTSTM1*b*, and Software Program H28DTSTM1*c*. Audio Data H28DTSTM1*a* is a data designed to be output from Speaker 204 (FIG. 1) and from any type of speaker of which the data format is wave data, MIDI, MP3 and/or other digital formats. Video Data H28DTSTM1*b* is a data designed to be output from LCD 201 (FIG. 1) and any type of display of which the data format is GIF, MPEG and/or other digital formats. Software Program H28DTSTM1*c* is a software program designed to be executed by CPU 211 (FIG. 1) or any type of personal computer. Data Stream H28DTSTM1 is primarily utilized to download video game software programs stored in Game Information Storage Area H28*b*1*b* (FIG. 585) and word processing softwares stored in Word Information Storage Area H28*b*1*c* (FIG. 586). Data Stream H28DTSTM1 is also utilized to download other types of software programs, such as calculators, schedulers, spreadsheet software programs, and other types of software programs.

FIG. 607 illustrates the second type of data stream sent from Host H (FIG. 429) to Communication Device 200 during the downloading process described in S8 of FIG. 601 and in S8 of FIG. 602. As described in FIG. 607, Data Stream H28DTSTM2 is composed of Audio Data H28DTSTM2*a* and Video Data H28DTSTM2*b*. Audio Data H28DTSTM2*a* is a data designed to be output from Speaker 204 (FIG. 1) and from any type of speaker of which the data format is wave data, MIDI, MP3 and/or other digital formats. Video Data H28DTSTM2*b* is a data designed to be output from LCD 201 (FIG. 1) and any type of display of which the data format is GIF, MPEG and/or other digital formats. Data Stream H28DTSTM2 is primarily utilized to download movies stored in Movie Information Storage Area 20628*b*1*d* (FIG. 587). Data Stream H28DTSTM2 is also utilized to download other types of audio visual data, such as soap operas, situation commedies, spreadsheet software programs, and other types of audio visual data.

FIG. 608 illustrates the third type of data stream sent from Host H (FIG. 429) to Communication Device 200 during the downloading process described in S8 of FIG. 601 and in S8 of FIG. 602. As described in FIG. 608, Data Stream H28DTSTM3 is composed of Audio Data H28DTSTM3*a*. Audio Data H28DTSTM3*a* is a data designed to be output from Speaker 204 (FIG. 1) and from any type of speaker of which the data format is wave data, MIDI, MP3 and/or other digital formats. Data Stream H28DTSTM3 is primarily utilized to download songs stored in Song Information Storage Area 20628*b*1*a* (FIG. 584). Data Stream H28DTSTM3 is also utilized to download other types of audio data, such as BGMs, musics, and other types of audio data.

FIG. 609 illustrates the sequence of Administration Software 20628ADS stored in Administration Software Storage Area 20628*c*2 (FIG. 599) to prohibit the use of the digital information when the license is expired. Referring to FIG. 609, the expiration date/time is set and stored in a specific area of RAM 206 (FIG. 1) (S1). The expiration date/time is periodically compared with the current time/date (S2). If the license is not expired, the digital information is enabled (or no action is implemented) (S3*a*). Alternatively, if the license is expired, the digital information is disabled (S3*b*). The sequence of S1 through S3 is applied to all pieces of digital information stored in Digital Information Storage Area 20628*b*1 (FIG. 594).

FIG. 610 illustrates another embodiment of Administration Software 20628ADS stored in Administration Software Storage Area 20628*c*2 (FIG. 599) to prohibit the use of the digital information when the license is expired. Referring to FIG. 610, the expiration date/time is set and stored in a specific area of RAM 206 (FIG. 1) (S1). The expiration date/time is periodically compared with the current time/date (S2). If the license is not expired, the digital information is enabled (or no action is implemented) (S3*a*). Alternatively, if the license is expired, the digital information is erased from RAM 206

(S3*b*). The sequence of S1 through S3 is applied to all pieces of digital information stored in Digital Information Storage Area **20628*b*1 (FIG. 594**).

FIG. 611 illustrates the sequence of Administration Software 20628ADS stored in Administration Software Storage Area **20628*c*2 (FIG. 599) to prohibit producing illegal copies of the digital information stored in Digital Information Storage Area 20628*b*1 (FIG. 594). Referring to FIG. 611, Administration Software 20628ADS stored in Administration Software Storage Area 20628*c*2 (FIG. 599) periodically monitors the activities of CPU 211 (FIG. 1) (S1). If the Administration Software 20628ADS detects that the digital information stored in Digital Information Storage Area 20628*b*1 (FIG. 594) is about to be copied (S2), it nullifies or blocks the copy command (S3**).

FIG. 612 illustrates the sequence of Administration Software 20628ADS stored in Administration Software Storage Area **20628*c*2 (FIG. 599) to prohibit producing illegal copies of the digital information stored in Digital Information Storage Area 20628*b*1 (FIG. 594). Referring to FIG. 612, Administration Software 20628ADS stored in Administration Software Storage Area 20628*c*2 (FIG. 599) periodically monitors the activities of CPU 211 (FIG. 1) (S1). If the Administration Software 20628ADS detects the digital information stored in Digital Information Storage Area 20628*b*1 (FIG. 594) is about to be copied (S2), it deletes the copied digital information from the destination directory (S3**).

FIG. 613 illustrates the sequence of display shown on LCD 201 (FIG. 1) to provide an option to the user of Communication Device 200 to purchase the license and use the program indefinitely in length of time. As described in FIG. 613, a prompt is shown on LCD 201 as described in S1. This prompt can be shown periodically during the license period or can be shown when the license is about to be expired. If the user chooses Yes in S1, then the amount charged is displayed (S2). Next, the user chooses the payment method from the three choices, i.e., 1. credit card, 2. money order, or 3. personal check (S3). Once the license is purchased, a message as shown in S4 is displayed on LCD 201.

FIG. 614 illustrates the sequence of Administration Software 20628ADS stored in Administration Software Storage Area **20628*c*2 (FIG. 599) to provide an option to the user of Communication Device 200 to purchase the license and use the program indefinitely in length of time as described in FIG. 613. Referring to FIG. 614, CPU 211 (FIG. 1) displays the prompt shown in S1 of FIG. 613. Whether the user chooses to purchase the license is determined by the input signal utilizing Input Device 210 or via voice recognition system, which is transferred to CPU 211 via Data Bus 203 (FIG. 1) (S2). If the user chooses Yes in S1 of FIG. 613, the amount charged is displayed on LCD 201 (FIG. 1) (S3). Next, the payment method is selected by the input signal input by utilizing Input Device 210 or via voice recognition system, which is transferred to CPU 211 via Data Bus 203 (S4). CPU 211 sends the information regarding the purchase of the license to Host H (FIG. 429). When Host H receives the information from Communication Device 200 and completes the verification process, it transfers a key data to unlock the license. Once the Communication Device 200 receives the key data, CPU 211 makes the term indefinite in period of time (S5) and displays a phrase shown in S4 of FIG. 613. Either of the following two methods may be utilized to unlock the license: the first method is to make the term of rental period indefinite; and the second method is to sever the link between Administration Software 20628ADS and the digital information, and release the digital information from the control of Administration Software 20628**ADS.

<<Online Renting Function—Flat Rate>>

FIGS. 615 and 616 illustrate another embodiment of the present function which enables to rent digital information with a flat rate. The drawing figures to explain the other embodiments of the present function also apply to this embodiment unless they are inconsistent with this embodiment. Primarily, FIGS. 580 through 599, 606 through 608, 611 through 614, and **619*a* through 633** apply to this embodiment.

FIG. 615 illustrates the sequence of the displays shown on LCD 201 (FIG. 1). Referring to FIG. 615, a prompt to input the user ID and password is displayed (S1). Once the information regarding the user ID and the password are input to Communication Device 200 and transferred to Host H (FIG. 429), and the user ID and the password are verified, a certain message indicating that the user ID and the password are verified is shown on LCD 201 (S2). A list of titles of the digital information is shown on LCD 201 (S3). The user selects one or more titles shown on LCD 201 by utilizing Input Device 210 (FIG. 1) or via voice recognition system which generates an input signal, which is transferred to CPU 211 (FIG. 1) via Input Interface 209 (FIG. 1) and Data Bus 203 (FIG. 1). Under the command of CPU 211 (FIG. 1), a request signal (not shown) is transferred to Host H (FIG. 429), and Host H transfers the relevant digital information in response. Before or while such sequence is performed, a screen to select the directory to store the digital information is displayed on LCD 201 (S4). The screen indicated in S5 is shown while the digital information is being transferred from Host H.

FIG. 616 illustrates the overall process from authentication to downloading the digital information. When the user inputs the user ID and password by utilizing Input Device 210 (FIG. 1) or via voice recognition system as described in S1 of FIG. 615, Host H (FIG. 429) initiates the authentication process (S1). If the positive flag (1) is found in Registration Data Storage Area H**28*b*2 (FIG. 588), a display shown in S2 of FIG. 615 is output from LCD 201 (FIG. 1) and the sequence is continued to S3*a*. The sequence is continued to S3*b* if the negative flag (0) is found in Registration Data Storage Area H28*b*2. If the negative flag (0) is found, error information is transferred to Communication Device 200, which is displayed on LCD 201 (FIG. 1) (S3*b*). If the positive flag (1) is found, the list of titles is transferred to Communication Device 200, and is displayed on LCD 201 as described in S3 of FIG. 615 (S3*a*). The user can select one or more titles by utilizing Input Device 210 (FIG. 1) or via voice recognition system (S4 and S5). Once the directory in which the digital information is to be stored is selected (S6), the downloading process is initiated (S7). As another embodiment, the number of the titles selected in S4 may be limited to a certain figure. As another embodiment, the digital information downloaded in S7 may be configured to be utilized only for a certain period of time (therefore, primarily the concept described in FIGS. 603 through 605, 609, and 610** apply to this embodiment).

<<Online Renting Function—(Sub) Category Display>>

FIGS. 617 and 618 illustrate another method to display the titles of the digital information described in FIGS. 600 and 615. A list of main categories is displayed on LCD 201 (FIG. 1), and a list of sub-categories is displayed when one main category is selected. Referring to the example described in FIG. 617, a list of Main Categories 20628CTG1 is displayed on LCD 201. Assuming that the user of Communication Device 200 selects Songs by utilizing Input Device 210 (FIG. 1) or via voice recognition system, a list of Sub-categories 20628CTG2 of Songs as described in FIG. 618 is displayed.

FIG. 619 illustrates the sequence of Administration Software 20628ADS stored in Administration Software Storage Area 20628*c*2 (FIG. 599) to implement the embodiment described in FIGS. 617 and 618. Referring to FIG. 619, CPU 211 (FIG. 1) downloads a category data containing information of Main Categories 20628CTG1 and Sub-categories 20628CTG2 of each digital information (S1). The category data may be stored in Digital Information Storage Area H28*b*1 (FIG. 583) of Host H (FIG. 429). CPU 211 displays a list of Main Categories 20628CTG1 on LCD 201 (FIG. 1) as described in FIG. 617 (S2). The user of Communication Device 200 selects a certain category therefrom (e.g., Songs in the present example) by utilizing Input Device 210 (FIG. 1) or via voice recognition system (S3), and a list of Sub-categories 20628CTG2 is displayed thereafter as described in FIG. 618 (S4) from which one title is selected (S5).

<<Online Renting Function—PC Download>>

FIGS. 619*a* through 631 illustrate an embodiment implementing the present function by further utilizing a personal computer. Communication Device 200 is utilized to select the digital information to be rented and the selected digital information is sent to Personal Computer PC (FIG. 619*a*) in which the selected digital information is stored. The digital information is primarily performed by Personal Computer PC in this embodiment.

FIG. 619*a* illustrates the storage area included in Personal Computer PC. As described in FIG. 619*a*, Personal Computer PC includes PC Information Storage Area PC00*a* of which the details are described hereinafter.

FIG. 620 illustrates the storage areas included in PC Information Storage Area PC00*a* (not shown in drawings). Here, PC Information Storage Area PC00*a* is a storage means installed in Personal Computer PC (FIG. 619*a*). As described in FIG. 620, PC Information Storage Area H00*a* includes Online Renting Information Storage Area PC28*a* of which the details are described in FIG. 621.

FIG. 621 illustrates the storage areas included in Online Renting Information Storage Area PC28*a* (FIG. 620). As described in FIG. 621, Online Renting Information Storage Area PC28*a* includes Online Renting Data Storage Area PC28*b* and Online Renting Software Storage Area PC28*c*. Online Renting Data Storage Area PC28*b* stores the data necessary to implement the present function, such as the ones described in FIGS. 622 through 628. Online Renting Software Storage Area PC28*c* stores the software program such as the one described in FIG. 629.

FIG. 622 illustrates the storage areas included in Online Renting Data Storage Area PC28*b* (FIG. 621). As described in FIG. 622, Online Renting Data Storage Area PC28*b* includes Digital Information Storage Area PC28*b*1 and Registration Data Storage Area PC28*b*2. Digital Information Storage Area PC28*b*1 stores various types of digital information downloaded from Host H (FIG. 429) for renting purposes for a certain period of time, such as songs, video games, word processing softwares, and movies as described hereinafter.

FIG. 623 illustrates the storage areas included in Digital Information Storage Area PC28*b*1 (FIG. 622). As described in FIG. 623, Digital Information Storage Area PC28*b*1 includes Song Information Storage Area PC28*b*1*a*, Game Information Storage Area PC28*b*1*b*, Word Information Storage Area PC28*b*1*c*, and Movie Information Storage Area PC28*b*1*d*. The data stored in Song Information Storage Area PC28*b*1*a* are described in FIG. 624. The data stored in Game Information Storage Area PC28*b*1*b* are described in FIG. 625. The data stored in Word Information Storage Area PC28*b*1*c* are described in FIG. 626. The data stored in Movie Information Storage Area PC28*b*1*d* are described in FIG. 627. The digital information stored in Digital Information Storage Area PC28*b*1 are downloaded from Host H (FIG. 429) by the instruction received from Communication Device 200 as described hereinafter.

FIG. 624 illustrates the data stored in Song Information Storage Area PC28*b*1*a* (FIG. 623). In the example described in FIG. 624, Song Information Storage Area PC28*b*1*a* stores Song A PC28*b*1*a*1, Song B PC28*b*1*a*2, and Song C PC28*b*1*a*3 downloaded from Host H (FIG. 429). Song A PC28*b*1*a*1, Song B PC28*b*1*a*2, and Song C PC28*b*1*a*3 are song and/or music data which are designed to be output from Speaker 216 (FIG. 1) of Communication Device 200. The data stored in Song Information Storage Area PC28*b*1*a* are also capable to be output from any type of speakers of any type of personal computers including Personal Computer PC (FIG. 619*a*).

FIG. 625 illustrates the data stored in Game Information Storage Area PC28*b*1*b* (FIG. 623). In the example described in FIG. 625, Game Information Storage Area PC28*b*1*b* stores Game A PC28*b*1*b*1, Game B PC28*b*1*b*2, and Game C PC28*b*1*b*3 downloaded from Host H (FIG. 429). Game A PC28*b*1*b*1, Game B PC28*b*1*b*2, and Game C PC28*b*1*b*3 are video game programs which are designed to be executed by Communication Device 200 and which display video game objects on LCD 201 (FIG. 1) manipulable by utilizing Input Device 210 (FIG. 1) or via voice recognition system. Shooting video game described in FIG. 270 and driving video game described in FIG. 284 are the examples of the video game programs stored in Game Information Storage Area PC28*b*1*b*. The video game programs stored in Game Information Storage Area PC28*b*1*b* are also capable to be executed by any type of personal computers including Personal Computer PC (FIG. 619*a*).

FIG. 626 illustrates the data stored in Word Information Storage Area PC28*b*1*c* (FIG. 623). In the example described in FIG. 626, Word Information Storage Area PC28*b*1*c* stores Word Processor A PC28*b*1*c*1, Word Processor B PC28*b*1*c*2, and Word Processor C PC28*b*1*c*3 downloaded from Host H (FIG. 429). Word Processor A PC28*b*1*c*1, Word Processor B PC28*b*1*c*2, and Word Processor C PC28*b*1*c*3 are word processing software programs designed to be executed by Communication Device 200 to type a plurality of alphanumeric data by utilizing Input Device 210 (FIG. 1) or via voice recognition system. 'Microsoft Word 2000' and 'Corel Word Perfect' are the examples of the word processing software programs stored in Word Information Storage Area PC28*b*1*c*. The word processing software programs stored in Game Information Storage Area PC28*b*1*b* are also capable to be executed by any type of personal computers including Personal Computer PC (FIG. 619*a*).

FIG. 627 illustrates the data stored in Movie Information Storage Area PC28*b*1*d* (FIG. 623). In the example described in FIG. 627, Movie Information Storage Area PC28*b*1*d* stores Movie A PC28*b*1*d*1, Movie B PC28*b*1*d*2, and Movie C PC28*b*1*d*3 downloaded from Host H (FIG. 429). Movie A PC28*b*1*d*1, Movie B PC28*b*1*d*2, and Movie C PC28*b*1*d*3 are movie programs designed to be executed by Communication Device 200 to output video data from LCD 201 (FIG. 1) and audio data from Speaker 216 (FIG. 1). 'Titanic' and 'Star Wars' are the examples of the movie programs stored in Movie Information Storage Area PC28*b*1*d*. Soap operas, situation comedies, news, and any type of TV programs are categorized as movie programs for purposes of implementing the present function. Soap operas, situation comedies, news, and any type of TV programs, as another embodiment, may be classified as different categories to implement the present function. The movie programs stored in Movie Information Storage Area PC28*b*1*d* are also capable to be executed by any type of personal computers including Personal Computer PC (FIG. 619*a*).

FIG. 628 illustrates the storage areas included in Online Renting Software Storage Area PC28*c* (FIG. 621). As described in FIG. 628, Online Renting Software Storage Area PC28*c* includes Administration Software Storage Area PC28*c*2. Administration Software Storage Area PC28*c*2 stores Administration Software PC28ADS which is downloaded from either Communication Device 200 or Host H (FIG. 429) and executed by Communication Device 200 to implement the present function of which the details are described hereinafter.

FIG. 629 illustrates the sequence of Administration Software 20628ADS stored in Online Renting Software Storage Area 20628*c* (FIG. 589) of Communication Device 200 to implement the present function by further utilizing Personal Computer PC (FIG. 619*a*). The sequence described in FIG. 629 is performed before S6 of FIG. 601, S6 of FIG. 602, and/or S6 of FIG. 616. Referring to FIG. 629, a list of devices (including Personal Computer PC) which are capable to download the digital information is displayed on LCD 201 (FIG. 1) (S1). The user of Communication Device 200 selects one of the devices by utilizing Input Device 210 (FIG. 1) or via voice recognition system (S2). Assuming that the user selects Personal Computer PC in S2. A list of directories is displayed on LCD 201 (S3). The user selects one of the directories by utilizing Input Device 210 (FIG. 1) or via voice recognition system (S4), and a Download Instruction 20628DIN is sent to Personal Computer PC of which the details are described in FIG. 630 (S5). Not to mention, the directory may be automatically designated and therefore omit S4.

FIG. 630 illustrates the information included in Download Instruction 20628DIN described in S5 of FIG. 629. As described in FIG. 630, Download Instruction 20628DIN includes Personal Computer ID 20628DIN1, Directory ID 20628DIN2, Digital Information ID 20628DIN3, and Host ID 20628DIN4. Personal Computer ID 20628DIN1 is an identification of Personal Computer PC (FIG. 619*a*) selected in S2 of FIG. 629. Directory ID 20628DIN2 is an identification of the directory selected in S4 of FIG. 629. Digital Information ID 20628DIN3 is an identification of the digital information selected in S2 of FIG. 601, S2 of FIG. 602, or S4 of FIG. 616. Host ID 20628DIN4. is an identification of Host H (FIG. 429).

FIG. 631 illustrates the sequence of Administration Software PC28ADS stored in Online Renting Software Storage Area PC28*c* (FIG. 628) to download the digital information. Referring to FIG. 631, Personal Computer PC (FIG. 619*a*) recieves Download Instruction 20628DIN (FIG. 630) from Communication Device 200 (S1), and retrieves Directory ID 20628DIN2, Digital Information ID 20628DIN3, and Host ID 20628DIN4 therefrom (S2). Personal Computer PC selects the directory in accordance with Directory ID 20628DIN2 (S3), and connects to Host H of which the Host ID is Host ID 20628DIN4 (S4). Personal Computer PC then requests for downloading the digital information by sending Digital Information ID 20628DIN3 to Host H (S5), and the downloading process is initiated thereafter (S6).

The concept described in the drawing figures to explain the present function, such as FIGS. 604 through 614, 617, 618, and 619 apply to this embodiment.

<<Online Renting Function—Other Embodiments of Administration Software>>

As another embodiment, Administration Software H28ADS of Host H (FIG. 429), Administration Software 20628ADS of Communication Device 200, and Administration Software PC28ADS of Personal Computer PC (FIG. 619*a*) may be merged into one administration software program and be stored in Host H and implement the present function therefrom. As another embodiment, the merged administration software program may be stored in Communication Device 200 or Personal Computer PC and implement the present function therefrom.

<<Online Renting Function—Relationship Between Administration Software & Digital Information>>

The preferred embodiment to implement the present function is to address the digital information and the administration software program as two different existances as already described hereinbefore. For example, the digital information in Host H (FIG. 429) is stored in Digital Information Storage Area H28*b*1 (FIG. 583) whereas Administration Software H28ADS in Host H is stored in Administration Software Storage Area H28*c*2 (FIG. 589). In the same manner, the digital information in Communication Device 200 is stored in Digital Information Storage Area 20628*b*1 (FIG. 594) whereas Administration Software 20628ADS in Communication Device 200 is stored in Administration Software Storage Area 20628*c*2 (FIG. 599); and the digital information in Personal Computer PC (FIG. 619*a*) is stored in Digital Information Storage Area PC28*b*1 (FIG. 623) whereas Administration Software 20628ADS in Personal Computer PC (FIG. 619*a*) is stored in Administration Software Storage Area PC28*c*2 (FIG. 628). Basically, one administration software program can administer more than one digital information. As another embodiment, the administration software program may be embedded in each digital information as described in FIG. 632. Here, the administration software program exists as many as the digital information. As another embodiment, the digital information may be embedded in the administration software program as described in FIG. 633. Here, one administration software program can administer more than one digital information by incorporating more digital information into itself. As another embodiment, administration software program can be stored in Host H, Communication Device 200, Personal Computer PC, or anywhere else so long as administration software program 503 can administer digital information.

As another embodiment, administration software program may be divided into two parts, i.e., the first administration software program and the second administration software program. The first part administration software program in Host H, whereas the second part administration software program is transferred from Host H, via Network NT, to Communication Device 200 in which the second part administration software program is stored. The first administration software program and the second administration software program are designed to interact and cooperate each other, and the first part administration software program aids the implementation of the second part administration software program, and vice versa.

As another embodiment, instead of downloading and storing the digital information in a directory as described hereinbefore, a certain area of RAM 206 (FIG. 1) may be utilized to temporarily store the digital information therein and can be erased therefrom once the digital information has been utilized or shown on LCD 201 (FIG. 1). Moreover, the digital information may be divided into a plurality of pieces and transfer the pieces in sequence from Host H to Communication Device 200. In this embodiment, each piece is temporarily stored in the certain area of RAM 206 and is erased therefrom once such piece is utilized or shown on LCD 201 while the next piece is ready to be stored in the certain area of RAM 206.

<<Online Renting Function—Summary>>

(1) A wireless communication device comprising a microphone, a speaker, and a multiple mode implementor, wherein said multiple mode implementor implements a voice communication mode and an online renting mode, a series of audio data are input to and output from said microphone and said speaker respectively when said voice communication mode is implemented, a rented digital information is downloaded to said wireless communication device and authorized to be utilized for a predetermined period of time when said online renting mode is implemented.

(2) An online renting system comprising a host, a communication device, and an administration software program wherein said host which a storage area which stores a plurality of digital information, said plurality of digital information are categorized in a first category and a second category, a list of said plurality of digital information is displayed on said communication device, a digital information is selected from said list, said digital information is downloaded to said communication device, and said digital information is performed by said communication device for a predetermined period of time under the control of said administration software program.

(3) A host which comprises a storage area which stores a plurality of digital information, said plurality of digital information are categorized in a first category and a second category, the plurality of digital information categorized in said first category are composed of audio data and visual data, the plurality of digital information categorized in said second category are composed of audio data, said host sends the digital information categorized in said first category if host receives a first request signal for the digital information categorized in said first category, and sends the digital information categorized in said second category if host receives a second request signal for the digital information categorized in said second category wherein the digital information categorized in said first category and the digital information categorized in said second category are enabled to be performed for a predetermined period of time.

(4) An administration software program which enables to display a list of digital information in a first category and a second category on a display of a computer, which enables to select a digital information from said list, which enables to download the selected digital information, wherein said digital information is performed for a predetermined period of time under the control of said administration software program.

(5) A third party downloading system comprising a host, a communication device, wherein a list of digital information and a list of devices are displayed on said communication device, a digital information is selected by said communication device, said digital information is downloaded thereafter to one of the devices which displayed on said list of devices and which is selected by said communication device.

<<SOS Calling Function>>

FIG. 634 through 645 illustrate the SOS calling function which enables Communication Device 200 to notify the police department the current location of Communication Device 200 and the personal Information rmation of the user of Communication 200 when a 911 call is dialed from Communication Device 200.

FIG. 634 illustrates the storage area included in Host Information Storage Area H00*a* (FIG. 429). As described in FIG. 634, Host Information Storage Area H00*a* includes SOS Calling Information Storage Area H29*a* of which the data stored therein are described in FIG. 635.

FIG. 635 illustrates the storage areas included in SOS Calling Information Storage Area H29*a* (FIG. 634). As described in FIG. 635, SOS Calling Information Storage Area H29*a* includes SOS Calling Data Storage Area H29*b* and SOS Calling Software Storage Area H29*c*. SOS Calling Data Storage Area H29*b* stores the data necessary to implement the present function, such as the ones described in FIGS. 636 and 637. SOS Calling Software Storage Area H29*c* stores the software programs necessary to implement the present function, such as the ones described in FIGS. 644 and 645.

FIG. 636 illustrates the storage area included in SOS Calling Data Storage Area H29*b* (FIG. 635). As described in FIG. 636, SOS Calling Data Storage Area H29*b* includes Police Department Location Data Storage Area H29*b*1 of which the data stored therein are described in FIG. 637.

FIG. 637 illustrates the data stored in Police Department Location Data Storage Area H29*b*1 (FIG. 636). As illustrated in FIG. 637, Police Department Location Data Storage Area H29*b*1 includes three columns, i.e., Police Dept ID, Location Data, and Phone #. Police Dept ID represents the identification of a police department (e.g., NYPD). Location Data represents the geographical location data (in x, y, z format) of the police department of the corresponding Police Dept ID. Phone # represents the phone number of the police department of the corresponding Police Dept ID. In the example described in FIG. 637, H29PD #1 is an identification of the police department of which the geographical location is H29LD #1 and of which the phone number is H29PN #1; H29PD #2 is an identification of the police department of which the geographical location is H29LD #2 and of which the phone number is H29PN #2; H29PD #3 is an identification of the police department of which the geographical location is H29LD #3 and of which the phone number is H29PN #3; and H29PD #4 is an identification of the police department of which the geographical location is H29LD #4 and of which the phone number is H29PN #4.

The data and software program necessary to implement the present function on the side of Communication Device 200 as described hereinafter are downloaded from Host H (FIG. 429) to Communication Device 200 in the manner described in FIGS. 401 through 407.

FIG. 638 illustrates the storage area included in RAM 206 (FIG. 1) of Communication Device 200. As described in FIG. 638, RAM 206 includes SOS Calling Information Storage Area 20629*a* of which the details are described in FIG. 639.

FIG. 639 illustrates the storage areas included in SOS Calling Information Storage Area 20629*a* (FIG. 638). As described in FIG. 639, SOS Calling Information Storage Area 20629*a* includes SOS Calling Data Storage Area 20629*b* and SOS Calling Software Storage Area 20629*c*. SOS Calling Data Storage Area 20629*b* includes data necessary to implement the present function, such as the ones described in FIGS. 640 and 641. SOS Calling Software Storage Area 20629*c* stores the software programs necessary to implement the present function, such as the one described in FIG. 642.

FIG. 640 illustrates storage areas included in SOS Calling Data Storage Area 20629*b* (FIG. 639). As described in FIG. 640, SOS Calling Data Storage Area 20629*b* includes GPS Data Storage Area 20629*b*1 and User Data Storage Area 20629*b*2. GPS Data Storage Area 20629*b*1 stores the data regarding the current geographical location produced by the method so-called GPS as described hereinbefore. User Data Storage Area 20629*b*2 stores the data regarding the personal information of the user of Communication Device 200 as described in FIG. 641.

FIG. 641 illustrates the data stored in User Data Storage Area **20629*b*2 (FIG. 640). As described in FIG. 641, User Data Storage Area 20629*b*2 includes User Data 20629UD which includes data regarding the personal information of the user of Communication Device 200. In the example described in FIG. 641, User Data 20629UD comprises Name, Age, Sex, Race, Blood Type, Home Address, and SSN. Name represents the name of the user of Communication Device 200; Age represents the age of the user of Communication Device 200; Sex represents the sex of the user of Communication Device 200; Race represents the race of the user of Communication Device 200; Blood Type represents the blood type of the user of Communication Device 200; Home Address represents the home address of the user of Communication Device 200; and SSN represents the social security number of the user of Communication Device 200**.

FIG. 642 illustrates the software program stored in SOS Calling Software Storage Area **20629*c* (FIG. 639). Referring to FIG. 642, when the user of Communication Device 200 inputs 911 by utilizing Input Device 210 (FIG. 1) or via voice recognition system (S1), CPU 211 (FIG. 1) calculates the GPS data, i.e., the current geographical location data by utilizing the method so-called GPS as described hereinbefore (S2), and stores the GPS data in GPS Data Storage Area 20629*b*1 (FIG. 640) (S3). CPU 211 then retrieves User Data 20629UD from User Data Storage Area 20629*b*2 (FIG. 641) and the GPS data from GPS Data Storage Area 20629*b*1 (FIG. 640) (S4), and composes SOS Data 20629SOS therefrom (S5), which is sent thereafter to Host H (FIG. 429) (S6**).

FIG. 643 illustrates the elements of SOS Data 20629SOS (FIG. 642). As described in FIG. 643, SOS Data 20629SOS comprises Connection Request 20629CR, GPS Data 20629GD, and User Data 20629UD. Connection Request 20629CR represents a request to Host H (FIG. 429) to forward the 911 call to a police department. GPS Data 20629GD is a data retrieved from GPS Data Storage Area **20629*b*1 (FIG. 641) as described in S4 of FIG. 642. User Data 20629UD is a data retrieved from User Data Storage Area 20629*b*2 (FIG. 641) as described in S4 of FIG. 642**.

FIG. 644 illustrates the software program stored in SOS Calling Software Storage Area H**29*c* (FIG. 635) of Host H (FIG. 429). Referring to FIG. 644, Host H periodically checks the incoming call (S1). If the incoming call is SOS Data 20629SOS (FIG. 643) (S2), Host H initiates the SOS calling process as described in FIG. 645 (S3**).

FIG. 645 illustrates the software program stored in SOS Calling Software Storage Area H**29*c* (FIG. 635) of Host H (FIG. 429). Referring to FIG. 645, Host H retrieves GPS Data 20629GD from SOS Data 20629SOS (FIG. 643) (S1), and selects the closest police department by comparing GPS Data 20629GD and the data stored in column Location Data of Police Department Location Data Storage Area H29*b*1 (FIG. 637) of Host H (S2). Host H then retrieves the corresponding phone number stored in column Phone # and connects the line between the corresponding police department and Communication Device 200 in order to initiate a voice communication therebetween (S3). Host H forwards to the police department thereafter GPS Data 20629GD and User Data 20629UD retrieved in S1 (S4**).

As another embodiment, User Data 20629UD stored in User Data Storage Area **20629*b*2 (FIG. 641) may be stored in SOS Calling Data Storage Area H29*b* (FIG. 635) of Host H (FIG. 429). In this embodiment, SOS Data 20629SOS (FIG. 642) primarily comprises Connection Request 20629CR and GPS Data 20629GD, and User Data 20629UD is retrieved from SOS Calling Data Storage Area H29*b* of Host H, which is sent to the police department in S4 of FIG. 645**.

<<Online Renting Function—Summary>>

(1) A wireless communication device comprising a microphone, a speaker, and a multiple mode implementor, wherein said multiple mode implementor implements a voice communication mode and an SOS calling mode, a series of audio data are input to and output from said microphone and said speaker respectively when said voice communication mode is implemented, an SOS information including a personal Information rmation of the user of said communication device is dispatched when said SOS calling mode is implemented.

(2) An online renting system comprising a host, a communication device, and an SOS calling software program wherein said SOS calling software program is installed to said communication device, said communication device, under the control of said SOS calling software program sends an SOS Information rmation to said host, said host forwards said SOS Information rmation to a police department wherein said SOS Information rmation includes a personal Information rmation of the user of said communication device.

(3) A host comprising a storage area which stores an SOS administration software program, said host periodically checks the incoming call, in the event said host receives an SOS Information rmation from a communication device, said host sends, under the control of said SOS administration software program, said SOS Information rmation to a police department with the personal Information rmation of the user of said communication device included therein.

(4) Said SOS Information rmation of the summaries (1) through (3) further includes GPS Information rmation indicating the current geographical location of said communication device.

<<Input Device>>

FIG. 646 illustrates the major elements of Input Device 210 (FIG. 1). As described in FIG. 646, Input Device 210 includes Numeric Data Input Device **21000*a*, Text Data Input Device 21000*b*, Function Data Input Device 21000*c*, and Joystick 21000*d*. Numeric Data Input Device 21000*a* is an input device to input numeric data of which the details are described in FIG. 647. Text Data Input Device 21000*b* is an input device to input text data of which the details are described in FIG. 648. Function Data Input Device 21000*c* is an input device designed to be utilized to implement specific action(s) depending on the mode, function, or mode described in this specification of which the details are described in FIG. 649. Joystick 21000*d* is an input device to move the cursor or any object displayed on LCD 201 (FIG. 1) of which the details are described in FIG. 650**.

FIG. 647 illustrates the major elements of Numeric Data Input Device **21000*a* (FIG. 646). As described in FIG. 647, Numeric Data Input Device 21000*a*** includes ten numeric keys, i.e., ‘1’, ‘2’, ‘3’, ‘4’, ‘5’, ‘6’, ‘7’, ‘8’, ‘9’, and ‘0’. Numeric data ‘1’ is input when numeric key ‘1’ is pressed down. Numeric data ‘2’ is input when numeric key ‘2’ is pressed down. Numeric data ‘3’ is input when numeric key ‘3’ is pressed down. Numeric data ‘4’ is input when numeric key ‘4’ is pressed down. Numeric data ‘5’ is input when numeric key ‘5’ is pressed down. Numeric data ‘6’ is input when numeric key ‘6’ is pressed down. Numeric data ‘7’ is input when numeric key ‘7’ is pressed down. Numeric data ‘8’ is input when numeric key ‘8’ is pressed down. Numeric data ‘9’ is input when numeric key ‘9’ is pressed down. Numeric data ‘0’ is input when numeric key ‘0’ is pressed down.

FIG. 648 illustrates the major elements of Text Data Input Device **21000*b* (FIG. 646). As described in FIG. 648, Text Data Input Device 21000*b*** includes twenty-six text keys, i.e., ‘a’, ‘b’, ‘c’, ‘d’, ‘e’, ‘f’, ‘g’, ‘h’, ‘i’, ‘j’, ‘k’, ‘l’, ‘m’, ‘n’, ‘o’, ‘p’, ‘q’, ‘r’, ‘s’, ‘t’, ‘u’, ‘v’, ‘w’, ‘x’, ‘y’, and ‘z’. Text data ‘a’ is input when text key ‘a’ is pressed down. Text data ‘b’ is input when text key ‘b’ is pressed down. Text data ‘c’ is input when text key ‘c’ is pressed down. Text data ‘d’ is input when text key ‘d’ is pressed down. Text data ‘e’ is input when text key ‘e’ is pressed down. Text data ‘f’ is input when text key ‘f’ is pressed down. Text data ‘g’ is input when text key ‘g’ is pressed down. Text data ‘h’ is input when text key ‘h’ is pressed down. Text data ‘i’ is input when text key ‘i’ is pressed down. Text data ‘j’ is input when text key ‘j’ is pressed down. Text data ‘k’ is input when text key ‘k’ is pressed down. Text data ‘l’ is input when text key ‘l’ is pressed down. Text data ‘m’ is input when text key ‘m’ is pressed down. Text data ‘n’ is input when text key ‘n’ is pressed down. Text data ‘o’ is input when text key ‘o’ is pressed down. Text data ‘p’ is input when text key ‘p’ is pressed down. Text data ‘q’ is input when text key ‘q’ is pressed down. Text data ‘r’ is input when text key ‘r’ is pressed down. Text data ‘s’ is input when text key ‘s’ is pressed down. Text data ‘t’ is input when text key ‘t’ is pressed down. Text data ‘u’ is input when text key ‘u’ is pressed down. Text data ‘v’ is input when text key ‘v’ is pressed down. Text data ‘w’ is input when text key ‘w’ is pressed down. Text data ‘x’ is input when text key ‘x’ is pressed down. Text data ‘y’ is input when text key ‘y’ is pressed down. Text data ‘z’ is input when text key ‘z’ is pressed down.

FIG. 649 illustrates the major elements of Function Data Input Device 21000*c* (FIG. 646). As described in FIG. 649, Function Data Input Device 21000*c* includes five keys, i.e., F1, F2, F3, F4, and F5. Each key of Function Data Input Device 21000*c* is assigned to implement a specific function depending on each mode, function, or system described in this specification.

FIG. 650 illustrates the connection between Joystick 21000*d* (FIG. 646) and Communication Device 200. As described in FIG. 650, Joystick 21000*d* is rotatably attached to the surface of Communication Device 200. Joystick 21000*d* can be shifted up, down, left, right, and rotate clockwise and unti-clockwise. The concept of the mechanism of Joystick 21000*d* is introduced in the following inventions and the references cited thereof: U.S. Pat. No. 6,497,618, U.S. Pat. No. 6,461,242, U.S. Pat. No. 6,325,718, U.S. Pat. No. 6,264,558, U.S. Pat. No. 6,248,018, U.S. Pat. No. 6,241,611, U.S. Pat. No. 6,171,191, U.S. Pat. No. 6,106,398, U.S. Pat. No. 6,102,803, U.S. Pat. No. 6,007,428 U.S. Pat. No. 5,984,785, U.S. Pat. No. 5,911,627, U.S. Pat. No. 5,738,352, U.S. Pat. No. 5,624,117, U.S. Pat. No. 5,286,024, and U.S. Pat. No. 4,531,740. As another embodiment, a trackball may be utilized instead of Joystick 21000*d* to move the cursor or any object displayed on LCD 201 (FIG. 1).

<<PC Remote Controlling Function>>

FIGS. 651 through 670 illustrate the PC remote controlling function which enables Communication Device 200 to remotely control a personal computer. The image displayed on the monitor of Personal Computer PC is displayed on LCD 201 (FIG. 1) of Communication Device 200, and the user of Communication Device 200 is able to remotely control Personal Computer PC by utilizing Input Device 210 (FIG. 1) or via voice recognition system.

FIG. 651 illustrates the connection between Communication Device 200 and Personal Computer PC. As described in FIG. 651, Communication Device 200 and Personal Computer PC are linked and able to send and receive data via Network NT.

FIG. 652 illustrates another embodiment of the connection between Communication Device 200 and Personal Computer PC. As described in FIG. 652, Communication Device 200 and Personal Computer PC may be directly linked, and send and receive data directly in a wireless fashion.

FIGS. 653 through 656 illustrate the data and software program programs stored in Communication Device 200 to implement the present function on the side of Communication Device 200.

The data and software programs necessary to implement the present function on the side of Communication Device 200 are downloaded from Host H (FIG. 429) to Communication Device 200 in the manner described in FIGS. 401 through 407.

FIG. 653 illustrates the storage area included in RAM 206 (FIG. 1). As described in FIG. 653, RAM 206 includes PC Remote Controlling Information Storage Area 20630*a* of which the data stored therein are described in FIG. 654.

FIG. 654 illustrates the storage areas included in PC Remote Controlling Information Storage Area 20630*a* (FIG. 653). As described in FIG. 654, PC Remote Controlling Information Storage Area 20630*a* includes PC Remote Controlling Data Storage Area 20630*b* and PC Remote Controlling Software Storage Area 20630*c*. PC Remote Controlling Data Storage Area 20630*b* stores the data necessary to implement the present function on the side of Communication Device 200, such as the ones described in FIGS. 655 and 656. PC Remote Controlling Software Storage Area 20630*c* stores the software programs necessary to implement the present function on the side of Communication Device 200, such as the ones described in FIGS. 662 through 664, and 668 through 670.

FIG. 655 illustrates the storage areas included in PC Remote Controlling Data Storage Area 20630*b* (FIG. 654). As described in FIG. 655, PC Remote Controlling Data Storage Area 20630*b* includes PC ID Data Storage Area 20630*b*1, Input Signal Data Storage Area 20630*b*2, PC Display Data Storage Area 20630*b*3, and PC Download Data Storage Area 20630*b*4. PC ID Data Storage Area 20630*b*1 stores the identifications of a plurality of personal computers including Personal Computer PC (FIGS. 651 and/or 652). Input Signal Data Storage Area 20630*b*2 stores the input signal data produced by Input Device 210 (FIG. 1) or via voice recognition system of which the details are described in FIG. 656. PC Display Data Storage Area 20630*b*3 stores the image data displayed on the monitor of Personal Computer PC (FIGS. 651 and/or 652). PC Download Data Storage Area 20630*b*4 stores the data and/or software programs downloaded from Personal Computer PC.

FIG. 656 illustrates the data stored in Input Signal Data Storage Area 20630*b*2 (FIG. 655). As described in FIG. 656, Input Signal Data Storage Area 20630*b*2 stores Keyboard Data 20630*b*2*a* and Mouse Data 20630*b*2*b* both of which are produced by Input Device 210 (FIG. 1) or via voice recognition system. Keyboard Data 20630*b*2*a* is an input signal data designed to operate the keyboard of Personal Computer PC to input alphanumeric data thereto. Mouse Data 20630*b*2*b* is an input signal data designed to operate the mouse of Personal Computer PC to move the mouse pointer displayed on the monitor of Personal Computer PC and/or to select and click the folders displayed thereon.

FIGS. 657 through 670 illustrate the data and software programs stored in Personal Computer PC (FIGS. 651 and/or 652) to implement the present function on the side of Personal Computer PC.

The data and software programs necessary to implement the present function on the side of Personal Computer PC (FIGS. 651 and/or 652) are downloaded from Host H (FIG. 429) to Personal Computer PC in the similar manner described in FIGS. 401 through 407.

FIG. 657 illustrates the storage area included in Personal Computer PC (FIGS. 651 and/or 652). As described in FIG. 657, Personal Computer PC includes PC Information Storage Area PC00*a*.

FIG. 658 illustrates the storage area included in PC Information Storage Area PC00*a* (FIG. 657). As described in FIG. 658, PC Information Storage Area PC00*a* includes PC Remote Controlling Information Storage Area PC30*a* of which the data stored therein are described in FIG. 659.

FIG. 659 illustrates the storage areas included in PC Remote Controlling Information Storage Area PC30*a* (FIG. 658). As described in FIG. 659, PC Remote Controlling Data Storage Area PC30*b* and PC Remote Controlling Software Storage Area PC30*c*. PC Remote Controlling Data Storage Area PC30*b* stores the data necessary to implement the present function on the side of Personal Computer PC (FIGS. 651 and/or 652), such as the ones described in FIGS. 660 and 661. PC Remote Controlling Software Storage Area PC30*c* stores the software programs necessary to implement the present function on the side of Personal Computer PC such as the ones described in FIGS. 664, 667 through 670.

FIG. 660 illustrates the storages areas included in PC Remote Controlling Data Storage Area PC30*b* (FIG. 659). As described in FIG. 660, PC Remote Controlling Data Storage Area PC30*b* includes Authentication Data Storage Area PC30*b*1, Input Signal Data Storage Area PC30*b*2, PC Display Data Storage Area PC30*b*3, and PC Upload Data Storage Area PC30*b*4. Authentication Data Storage Area PC30*b*1 stores the authentication data regarding the user of Communication Device 200, i.e., the user ID and the password of the user to enable him/her to remotely control Personal Computer PC (FIGS. 651 and/or 652) by implementing the present function. Input Signal Data Storage Area PC30*b*2 stores the input signal data produced by Input Device 210 (FIG. 1) or via voice recognition system of Communication Device 200 of which the details are described in FIG. 661. PC Display Data Storage Area PC30*b*3 stores the image data displayed on the monitor of Personal Computer PC. PC Upload Data Storage Area PC30*b*4 stores the data and/or software programs which are to be uploaded to Communication Device 200.

FIG. 661 illustrates the data stored in Input Signal Data Storage Area PC30*b*2 (FIG. 660). As described in FIG. 661, Input Signal Data Storage Area PC30*b*2 stores Keyboard Data PC30*b*2*a* and Mouse Data PC30*b*2*b* both of which are produced by Input Device 210 (FIG. 1) or via voice recognition system of Communication Device 200 and sent to Personal Computer PC (FIGS. 651 and/or 652). Keyboard Data PC30*b*2*a* is an input signal data designed to operate the keyboard of Personal Computer PC to input alphanumeric data thereto. Mouse Data PC30*b*2*b* is an input signal data designed to operate the mouse of Personal Computer PC to move the mouse pointer displayed on a monitor of Personal Computer PC and/or selecting and clicking the folders displayed thereon.

FIG. 662 illustrates the software program stored in PC Remote Controlling Software Storage Area 20630*c* (FIG. 654). Referring to FIG. 662, an input signal to activate the present function is input by utilizing Input Device 210 (FIG. 1) or via voice recognition system (S1). CPU 211 then retrieves the identifications of the personal computers including Personal Computer PC (FIGS. 651 and/or 652) stored in PC ID Data Storage Area 20630*b*1 (FIG. 655) (S2), and displays a list of the personal computers on LCD 201 (FIG. 1) (S3). An input signal to select one of the personal computers displayed in S3 is input by utilizing Input Device 210 or via voice recognition system (S4), and the PC connection process is initiated thereafter of which the details are described in FIG. 663 (S5).

FIG. 663 illustrates the PC connection process described in S5 of FIG. 663 executed by the software program stored in PC Remote Controlling Software Storage Area 20630*c* (FIG. 654) of Communication Device 200. Referring to FIG. 663, a user ID and password are input by utilizing Input Device 210 (FIG. 1) or via voice recognition system (S1). The user ID and password are transferred to Personal Computer PC (FIGS. 651 and/or 652) and compared with the ones stored in Authentication Data Storage Area PC30*b*1 (FIG. 660) (S2). If the user ID and password sent from Communication Device 200 are identical to the ones stored in Authentication Data Storage Area PC30*b*1 (S3), the PC remote control process is initiated thereafter of which the details are described in FIG. 664 (S4).

FIG. 664 illustrates the PC remote control process described in S4 of FIG. 663 executed by both the software program stored in PC Remote Controlling Software Storage Area 20630*c* (FIG. 654) of Communication Device 200 and the software program stored in PC Remote Controlling Software Storage Area PC30*c* (FIG. 659) of Personal Computer PC (FIGS. 651 and/or 652). Referring to FIG. 664, the input signal data to remotely control Personal Computer PC (FIGS. 651 and/or 652) is input by utilizing Input Device 210 (FIG. 1) or via voice recognition system and stored in Input Signal Data Storage Area 20630*b*2 (FIG. 655) of Communication Device 200 (S1). CPU 211 (FIG. 1) then sends to Personal Computer PC (FIGS. 651 and/or 652) PC Control Signal 20630CS of which the details are described in FIGS. 665 and 666 (S2). Once Personal Computer PC receives PC Control Signal 20630CS (S3), it retrieves Input Signal Data 20630CS3 (FIG. 666) (S4), and further retrieves Keyboard Data 20630*b*2*a* and Mouse Data 20630*b*2*b* therefrom and stores them to Input Signal Data Storage Area PC30*b*2 (FIG. 660) (S5). Keyboard Data 20630*b*2*a* and Mouse Data 20630*b*2*b* are treated as Keyboard Data PC30*b*2*a* and Mouse Data PC30*b*2*b* hereafter. The PC implementation process is initiated thereafter of which the details are described in FIG. 667 (S6). S1 and S2 are executed by Communication Device 200 and S3 through S6 are executed by Personal Computer PC.

FIG. 665 illustrates the data stored in PC Control Signal 20630CS described in S2 of FIG. 664. As described in FIG. 665, PC Control Signal 20630CS includes Communication Device ID 20630CS1, Personal Computer ID 20630CS2, and Input Signal Data 20630CS3. Communication Device ID 20630CS1 is an identification of Communication Device 200. Personal Computer ID 20630CS2 is an identification of Personal Computer PC (FIGS. 651 and/or 652). Input Signal Data 20630CS3 is a data retrieved from Input Signal Data Storage Area 20630*b*2 (FIG. 655) of Communication Device 200 of which the details are described in FIG. 666.

FIG. 666 illustrates the data included in Input Signal Data 20630CS3 (FIG. 665). As described in FIG. 666, Input Signal Data 20630CS3 includes Keyboard Data 20630CS3*a* and Mouse Data 20630CS3*b*. Keyboard Data 20630CS3*a* is an input signal data designed to operate the keyboard of Personal Computer PC (FIGS. 651 and/or 652) to input alphanumeric data thereto. Mouse Data 20630CS3*b* is an input signal data designed to operate the mouse of Personal Computer PC to move the mouse pointer displayed on a monitor of Personal Computer PC and/or to select and click the folders displayed thereon.

FIG. 667 illustrates the PC implementation process described in S6 of FIG. 664 executed by the software program stored in PC Remote Controlling Software Storage Area PC30*c* (FIG. 659) of Personal Computer PC (FIGS. 651 and/or 652). Referring to FIG. 667, Keyboard Data PC30*b*2*a* and Mouse Data PC30*b*2*b* are retrieved from Input Signal Data Storage Area PC30*b*2 (FIG. 660) and input to Personal Computer PC as input signals (S1). Personal Computer PC initiates a process in accordance with Keyboard Data PC30*b*2*a* and Mouse Data PC30*b*2*b* (S2). The process described in S2 is any type of process which Personal Computer PC is capable to implement, for example: open/close a word processing software program, create/edit a document, send/receive an email, initiate a video game, start a movie, play a music (song), playback a video, open/close a (sub) folder, select data, delete data, cut (copy) & paste data, send data in a wireless fashion, etc. Personal Computer PC then produces a PC display data in a real time (S3), which is stored in PC Display Data Storage Area PC30*b*3 (FIG. 660) (S4). Here, the PC display data is an image data displayed on the monitor of Personal Computer PC which is designed to be displayed on LCD 201 (FIG. 1) of Communication Device 200. The PC response process is initiated thereafter (S5).

FIG. 668 illustrates the PC response process described in S5 of FIG. 667 executed by both the software program stored in PC Remote Controlling Software Storage Area 20630*c* (FIG. 654) of Communication Device 200 and the software program stored in PC Remote Controlling Software Storage Area PC30*c* (FIG. 659) of Personal Computer PC (FIGS. 651 and/or 652). Referring to FIG. 668, Personal Computer PC retrieves the PC display data from PC Display Data Storage Area PC30*b*3 (FIG. 660) (S1), which is sent to Communication Device 200 (S2). CPU 211 (FIG. 1) of Communication Device 200 stores the received PC display data to PC Display Data Storage Area 20630*b*3 (FIG. 655) (S3). CPU 211 then retrieves the PC display data from PC Display Data Storage Area 20630*b*3 (S4) and displays it on LCD 201 (FIG. 1) (S5). S1 and S2 are executed by Personal Computer PC and S3 through S5 are executed by Communication Device 200.

The sequence described in FIGS. 664 through 668 is repeated for each input signal data produced in S1 of FIG. 664. The sequence described in FIGS. 664 through 668 are normally repeated more than few times per second, thereby, the user of Communication Device 200 is capable to remotely control Personal Computer PC (FIGS. 651 and/or 652) in a real time.

The sequence of S3 of FIG. 667 through S5 of FIG. 668 is executed in the first place before initiating the sequence described in FIGS. 664 through 668 to display the PC display data of Personal Computer PC (FIGS. 651 and/or 652) on LCD 201 (FIG. 1) of Communication Device 200 upfront.

<<PC Remote Controlling Function—Download>>

FIGS. 669 and 670 illustrate the method to download files from Personal Computer PC (FIGS. 651 and/or 652) to Communication Device 200. FIGS. 651 through 668 apply to this embodiment except that FIGS. 667 and 668 are replaced with the following FIGS. 669 and 670 respectively. Assume that Input Signal Data 20630CS3 (FIG. 666) includes a command to download a file from Personal Computer PC to Communication Device 200 produced by utilizing Input Device 210 (FIG. 1) or via voice recognition system.

FIG. 669 illustrates the PC implementation process described in S6 of FIG. 664 for purposes of downloading a file from Personal Computer PC (FIGS. 651 and/or 652) to Communication Device 200. Such implementation is executed by both the software program stored in PC Remote Controlling Software Storage Area 20630*c* (FIG. 654) of Communication Device 200 and the software program stored in PC Remote Controlling Software Storage Area PC30*c* (FIG. 659) of Personal Computer PC. Referring to FIG. 669, Keyboard Data PC30*b*2*a* and Mouse Data PC30*b*2*b* are retrieved from Input Signal Data Storage Area PC30*b*2 (FIG. 660) and input to Personal Computer PC as input signals (S1). Here, the combination of Keyboard Data PC30*b*2*a* and Mouse Data PC30*b*2*b* represents a download command of the selected file. Personal Computer PC initiates a process in accordance with Keyboard Data PC30*b*2*a* and Mouse Data PC30*b*2*b*, and stores the file selected in S1 to PC Upload Data Storage Area PC30*b*4 (FIG. 660) (S2). Personal Computer PC then produces a PC display data (S3), which is stored in PC Display Data Storage Area PC30*b*3 (FIG. 660) (S4). Here, the PC display data is an image data displayed on the monitor of Personal Computer PC which is designed to be displayed on LCD 201 (FIG. 1) of Communication Device 200. The PC response process is initiated thereafter (S5).

FIG. 670 illustrates the PC response process described in S5 of FIG. 667 executed by both the software program stored in PC Remote Controlling Software Storage Area 20630*c* (FIG. 654) of Communication Device 200 and the software program stored in PC Remote Controlling Software Storage Area PC30*c* (FIG. 659) of Personal Computer PC (FIGS. 651 and/or 652). Referring to FIG. 670, Personal Computer PC retrieves the PC display data from PC Display Data Storage Area PC30*b*3 (FIG. 660) (S1) and the PC store data, i.e., the file selected in S1 of FIG. 669, from PC Upload Data Storage Area PC30*b*4 (FIG. 660) (S2), both of which are sent to Communication Device 200 (S3). CPU 211 (FIG. 1) of Communication Device 200 stores the received PC display data to PC Display Data Storage Area 20630*b*3 (FIG. 655) (S4) and the received PC store data to PC Download Data Storage Area 20630*b*4 (FIG. 655) (S5). CPU 211 then retrieves the PC display data from PC Display Data Storage Area 20630*b*3 (S6) and displays it on LCD 201 (FIG. 1) (S7). The PC store data stored in PC Download Data Storage Area 20630*b*4 can be processed thereafter in any way in accordance with the input signal input by utilizing Input Device 210 (FIG. 1) or via voice recognition system.

As another embodiment, the concept described in FIGS. 651 through 670 may be applied to Personal Computer PC (FIGS. 651 and/or 652) remotely controlling Communication Device 200. Namely, the image displayed on LCD 201 (FIG. 1) of Communication Device 200 is displayed on the monitor of Personal Computer PC, and the user of Personal Computer PC is able to remotely control Communication Device 200 by utilizing the keyboard and/or the mouse of Personal Computer PC.

As another embodiment, the concept described in FIGS. 651 through 670 may be applied to Communication Device 200 (Device A) remotely controlling another Communication Device 200 (Device B). Namely, the image displayed on LCD 201 (FIG. 1) of Device B is displayed on LCD 201 of Device A, and the user of Device A is able to remotely control Device B by utilizing Input Device 210 (FIG. 1) or via voice recognition system of Device A.

<<PC Remote Controlling Function—Summary>>

(1) A PC remote controlling system comprising a wireless communication device and a personal computer, said wireless communication device comprises a microphone, a speaker, a display, an input device and a multiple mode implementor, wherein said multiple mode implementor implements a voice communication mode and an PC remote controlling mode, a series of audio data are input to and output from said microphone and said speaker respectively when said voice communication mode is implemented, a PC control signal input via said input device is transferred to said personal computer, and said personal computer operates in accordance with said PC control signal when said PC remote controlling mode is implemented.

(2) A wireless communication device comprising a microphone, a speaker, a display, an input device and a multiple mode implementor, wherein said multiple mode implementor implements a voice communication mode and an PC remote controlling mode, a series of audio data are input to and output from said microphone and said speaker respectively when said voice communication mode is implemented, a PC control signal input via said input device is transferred to a personal computer in order to operate said personal computer in accordance with said PC control signal when said PC remote controlling mode is implemented.

(3) A PC remote controlling software program installed in a wireless communication device comprising a microphone, a speaker, a display, an input device and a multiple mode implementor, wherein said multiple mode implementor implements a voice communication mode and an PC remote controlling mode, a series of audio data are input to and output from said microphone and said speaker respectively when said voice communication mode is implemented, said PC remote controlling software program transfers a PC control signal produced by said input device to a personal computer in order to operate said personal computer in accordance with said PC control signal when said PC remote controlling mode is implemented.

<<PC Remote Downloading Function>>

FIGS. 671 through 701 illustrate the PC remote downloading function which enables Communication Device 200 to remotely instruct a personal computer to transfer a data to another personal computer.

FIG. 671 illustrates the connection between Communication Device 200, Personal Computer PC#1, and Personal Computer PC#2. As described in FIG. 671, Communication Device 200, Personal Computer PC#1, and Personal Computer PC#2 are linked and capable to communicate via Network NT (e.g., the Internet). Personal Computer PC#1 and Personal Computer PC#2 are personal computers, such as desktops and/or laptops, controllable by the user of Communication Device 200.

FIG. 672 illustrates another embodiment of the connection between Communication Device 200, Personal Computer PC#1, and Personal Computer PC#2. As described in FIG. 672, Communication Device 200, Personal Computer PC#1, and Personal Computer PC#2 are directly connected to each other in a wireless fashion or by utilizing cables.

FIG. 673 illustrates the storage area included in RAM 206 (FIG. 1) of Communication Device 200. As described in FIG. 673, RAM 206 includes PC Remote Downloading Information Storage Area 20631*a* of which the data and software programs stored therein are described in FIG. 674.

The data and software programs stored in PC Remote Downloading Information Storage Area 20631*a* (FIG. 673) are downloaded from Host H (FIG. 429) in the manner described in FIGS. 401 through 407.

FIG. 674 illustrates the storage areas included in PC Remote Downloading Information Storage Area 20631*a* (FIG. 673). As described in FIG. 674, PC Remote Downloading Information Storage Area 20631*a* includes PC Remote Downloading Data Storage Area 20631*b* and PC Remote Downloading Software Storage Area 20631*c*. PC Remote Downloading Data Storage Area 20631*b* stores the data necessary to implement the present function on the side of Communication Device 200, such as the ones described in FIGS. 675 and 676. PC Remote Downloading Software Storage Area 20631*c* stores the software programs necessary to implement the present function on the side of Communication Device 200, such as the ones described in FIGS. 685 through 689.

FIG. 675 illustrates the storage areas included in PC Remote Downloading Data Storage Area 20631*b* (FIG. 674). As described in FIG. 675, PC Remote Downloading Data Storage Area 20631*b* includes PC ID Data Storage Area 20631*b*1, PC Display Data Storage Area 20631*b*2, and Input Signal Data Storage Area 20631*b*3. PC ID Data Storage Area 20631*b*1 stores the identifications of the personal computers, including Personal Computer PC#1 and Personal Computer PC#2, which are capable to participate in implementing the present function. PC Display Data Storage Area 20631*b*2 stores the image data displayed on the monitors of Personal Computer PC#1 and Personal Computer PC#2 of which the details are described in FIG. 676. Input Signal Data Storage Area 20631*b*3 stores input signal data produced by Input Device 210 (FIG. 1) or via voice recognition system.

FIG. 676 illustrates the storage areas included in PC Display Data Storage Area 20631*b*2 (FIG. 675). As described in FIG. 676, PC Display Data Storage Area 20631*b*2 includes PC#1 Display Data Storage Area 20631*b*2*a* and PC#2 Display Data Storage Area 20631*b*2*b*. PC#1 Display Data Storage Area 20631*b*2*a* stores the image data displayed on the monitor of Personal Computer PC#1 received from Personal Computer PC#1. PC#2 Display Data Storage Area 20631*b*2*b* stores the image data displayed on the monitor of Personal Computer PC#2 received from Personal Computer PC#2.

FIG. 677 illustrates the storage area included in Personal Computer PC#1 (FIGS. 671 and/or 672). As described in FIG. 677, Personal Computer PC#1 includes PC#1 Information Storage Area PC#1-00*a* of which the data and software programs stored therein are described in FIG. 678.

The data and software programs stored in PC#1 Information Storage Area PC#1-00*a* (FIG. 677) are downloaded from Host H (FIG. 429) in the similar manner described in FIGS. 401 through 407.

FIG. 678 illustrates the storage area included in PC#1 Information Storage Area PC#1-00*a* (FIG. 677). As described in FIG. 678, PC#1 Information Storage Area PC#1-00*a* includes PC#1 Remote Downloading Information Storage Area PC#1-31*a* of which the data and software programs stored therein are described in FIG. 679.

FIG. 679 illustrates the storages areas included in PC#1 Remote Downloading Information Storage Area PC#1-31*a* (FIG. 678). As described in FIG. 679, PC#1 Remote Downloading Information Storage Area PC#1-31*a* includes PC#1 Remote Downloading Data Storage Area PC#1-31*b* and PC#1 Remote Downloading Software Storage Area PC#1-31*c*. PC#1 Remote Downloading Data Storage Area PC#1-31*b* stores the data necessary to implement the present function on the side of Personal Computer PC#1, such as the ones described in FIG. 680. PC#1 Remote Downloading Software Storage Area PC#1-31*c* stores the software programs necessary to implement the present function on the side of Personal Computer PC#1, such as the ones described in FIGS. 688 and 692.

FIG. 680 illustrates the storage areas included in PC#1 Remote Downloading Data Storage Area PC#1-31*b* (FIG. 679). As described in FIG. 680, PC#1 Remote Downloading Data Storage Area PC#1-31*b* includes PC#1 Uploading Data Storage Area PC#1-31*b*1, PC#1 Display Data Storage Area PC#1-31*b*2, and PC#1 Input Signal Data Storage Area PC#1-31*b*3. PC#1 Uploading Data Storage Area PC#1-31*b*1 stores the data which is transferred to Personal Computer PC#2 (FIGS. 671 and/or 672). PC#1 Display Data Storage Area PC#1-31*b*2 stores the image data displayed on the monitor of Personal Computer PC#1. PC#1 Input Signal Data Storage Area PC#1-31*b*3 stores the input signal data received from Communication Device 200 to remotely control Personal Computer PC#1 (FIGS. 671 and/or 672).

FIG. 681 illustrates the storage area included in Personal Computer PC#2 (FIGS. 671 and/or 672). As described in FIG. 681, Personal Computer PC#2 includes PC#2 Information Storage Area PC#2-00*a* of which the data and software programs stored therein are described in FIG. 682.

The data and software programs stored in PC#2 Information Storage Area PC#2-00*a* (FIG. 681) are downloaded from Host H (FIG. 429) in the similar manner described in FIGS. 401 through 407.

FIG. 682 illustrates the storage area included in PC#2 Information Storage Area PC#2-00*a* (FIG. 681). As described in FIG. 682, PC#2 Information Storage Area PC#2-00*a* includes PC#2 Remote Downloading Information Storage Area PC#2-31*a* of which the data and software programs stored therein are described in FIG. 683.

FIG. 683 illustrates the storages areas included in PC#2 Remote Downloading Information Storage Area PC#2-31*a* (FIG. 682). As described in FIG. 683, PC#2 Remote Downloading Information Storage Area PC#2-31*a* includes PC#2 Remote Downloading Data Storage Area PC#2-31*b* and PC#2 Remote Downloading Software Storage Area PC#2-31*c*. PC#2 Remote Downloading Data Storage Area PC#2-31*b* stores the data necessary to implement the present function on the side of Personal Computer PC#2 (FIGS. 671 and/or 672), such as the ones described in FIG. 684. PC#2 Remote Downloading Software Storage Area PC#2-31*c* stores the software programs necessary to implement the present function on the side of Personal Computer PC#2, such as the ones described in FIGS. 689 and 693.

FIG. 684 illustrates the storage areas included in PC#2 Remote Downloading Data Storage Area PC#2-31*b* (FIG. 683). As described in FIG. 684, PC#2 Remote Downloading Data Storage Area PC#2-31*b* includes PC#2 Downloading Data Storage Area PC#2-31*b*1, PC#2 Display Data Storage Area PC#2-31*b*2, and PC#2 Input Signal Data Storage Area PC#2-31*b*3. PC#2 Downloading Data Storage Area PC#2-31*b*1 stores the data which is transferred from Personal Computer PC#1 (FIGS. 671 and/or 672). PC#2 Display Data Storage Area PC#2-31*b*2 stores the image data displayed on the monitor of Personal Computer PC#2 (FIGS. 671 and/or 672). PC#2 Input Signal Data Storage Area PC#2-31*b*3 stores the input signal data received from Communication Device 200 to remotely control Personal Computer PC#2.

FIG. 685 illustrates the software program stored in PC Remote Downloading Software Storage Area 20631*c* (FIG. 674) which identifies and register the identifications of the personal computers capable to participate in implementing the present function. Referring to FIG. 685, CPU 211 (FIG. 1) sends an identification request to all recognized personal computers (S1). Here, the identification request is a signal which requests to send back a response to Communication Device 200. If a response to the identification request including the identification of the responding personal computer is returned (S2), CPU 211 registers the identification of such personal computer to PC ID Data Storage Area 20631*b*1 (FIG. 675) (S3). Assume that each of Personal Computer PC#1 and Personal Computer PC#2 (FIGS. 671 and/or 672) returns the response described in S2 and their identifications are stored in PC ID Data Storage Area 20631*b*1.

FIG. 686 illustrates the software program stored in PC Remote Downloading Software Storage Area 20631*c* (FIG. 674) which selects the personal computer from which a data is transferred. Referring to FIG. 686, an input signal which indicates to initiate the process to select the personal computer from which a data is transferred is input by utilizing Input Device 210 (FIG. 1) or via voice recognition system (S1). CPU 211 (FIG. 1) retrieves all identifications of the personal computers stored in PC ID Data Storage Area 20631*b*1 (FIG. 675) (S2), and displays a list of these identifications on LCD 201 (FIG. 1) (S3). A personal computer is selected from the list by utilizing Input Device 210 or via voice recognition system (S4). Assume that Personal Computer PC#1 (FIGS. 671 and/or 672) is selected in S4.

FIG. 687 illustrates the software program stored in PC Remote Downloading Software Storage Area 20631*c* (FIG. 674) which selects the personal computer to which a data is transferred from the personal computer selected in S4 of FIG. 686 (i.e., Personal Computer PC#1). Referring to FIG. 687, an input signal which indicates to initiate the process to select the personal computer to which a data is transferred is input by utilizing Input Device 210 (FIG. 1) or via voice recognition system (S1). CPU 211 (FIG. 1) retrieves all identifications of the personal computers stored in PC ID Data Storage Area 20631*b*1 (FIG. 675) (S2), and displays a list of these identifications on LCD 201 (FIG. 1) (S3). A personal computer is selected from the list by utilizing Input Device 210 or via voice recognition system (S4). Assume that Personal Computer PC#2 (FIGS. 671 and/or 672) is selected in S4.

FIG. 688 illustrates both the software program stored in PC Remote Downloading Software Storage Area 20631*c* (FIG. 674) of Communication Device 200 and the software program stored in PC#1 Remote Downloading Software Storage Area PC#1-31*c* (FIG. 679) of Personal Computer PC#1 (FIGS. 671 and/or 672) which select the transferring data stored in Personal Computer PC#1 to be transferred to Personal Computer PC#2 (FIGS. 671 and/or 672). Referring to FIG. 688, CPU 211 (FIG. 1) of Communication Device 200 sends a directory request to Personal Computer PC#1 (S1). Personal Computer PC#1, in response to the directory request, retrieves the data regarding its directory structure including the identifications of the data (including software programs and other types of information) stored in each directory (S2) and sends the data to Communication Device 200 (S3). Upon receiving the data from Personal Computer PC#1, CPU 211 of Communication Device 200 displays the directories of Personal Computer PC#1 on LCD 201 (FIG. 1) including the identifications of the data stored in each directory (S4). A certain directory is selected by utilizing Input Device 210 (FIG. 1) or via voice recognition system (S5). The transferring data which is to be transferred to Personal Computer PC#2 is selected thereafter in the same manner from the directory selected in S5 (S6).

FIG. 689 illustrates both the software program stored in PC Remote Downloading Software Storage Area 20631*c* (FIG. 674) of Communication Device 200 and the software program stored in PC#2 Remote Downloading Software Storage Area PC#2-31*c* (FIG. 683) of Personal Computer PC#2 (FIGS. 671 and/or 672) which select the directory of Personal Computer PC#2 in which the transferring data selected in S6 of FIG. 688 is to be stored. Referring to FIG. 689, CPU 211 (FIG. 1) of Communication Device 200 sends a directory request to Personal Computer PC#2 (S1). Personal Computer PC#2, in response to the directory request, retrieves the data regarding its directory structure including the identifications of the data stored in each directory (S2) and sends the data to Communication Device 200 (S3). Upon receiving the data from Personal Computer PC#2, CPU 211 of Communication Device 200 displays the directories of Personal Computer PC#2 on LCD 201 (FIG. 1) including the identifications of the data stored in each directory (S4). A certain directory is selected by utilizing Input Device 210 (FIG. 1) or via voice recognition system in which the transferring data selected in S6 of FIG. 688 is to be stored (S5).

FIG. 690 illustrates the software program stored in PC Remote Downloading Software Storage Area 20631*c* (FIG. 674) of Communication Device 200 which initiates the data transfer from Personal Computer PC#1 to Personal Computer PC#2 (FIGS. 671 and/or 672). Referring to FIG. 690, CPU 211 (FIG. 1) of Communication Device 200 sends Data Transfer Initiation Signal 20631TIS to Personal Computer PC#1 of which the data included therein are described in FIG. 691.

FIG. 691 illustrates the data included in Data Transfer Initiation Signal 20631TIS (FIG. 690). As described in FIG. 691, Data Transfer Initiation Signal 20631TIS includes Communication Device ID 20631TIS1, Personal Computer PC#1 ID 20631TIS2, Personal Computer PC#2 ID 20631TIS3, PC#1 Directory 20631TIS4, PC#1 Transferring Data File Name 20631TIS5, and PC#2 Directory 20631TIS6. Communication Device ID 20631TIS1 is the identification of Communication Device 200. Personal Computer PC#1 ID 20631TIS2 is the identification of Personal Computer PC#1 (FIGS. 671 and/or 672). Personal Computer PC#2 ID 20631TIS3 is the identification of Personal Computer PC#2 (FIGS. 671 and/or 672). PC#1 Directory 20631TIS4 is an identification of the directory of Personal Computer PC#1 in which the transferring data selected in S6 of FIG. 688 is to be stored. PC#1 Transferring Data File Name 20631TIS5 is an identification of the transferring data selected in S6 of FIG. 688. PC#2 Directory 20631TIS6 is an identification of the directory of Personal Computer PC#2 in which the transferring data sent from Personal Computer PC#1 is to be stored.

FIG. 692 illustrates the software program stored in PC#1 Remote Downloading Software Storage Area PC#1-31*c* (FIG. 679) of Personal Computer PC#1 (FIGS. 671 and/or 672) which sends the transferring data selected in S6 of FIG. 688 to Personal Computer PC#2 (FIGS. 671 and/or 672). Upon receiving Data Transfer Initiation Signal 20631TIS (FIG. 691) from Communication Device 200 (S1), Personal Computer PC#1 retrieves Personal Computer PC#1 ID 20631TIS2, Personal Computer PC#2 ID 20631TIS3, PC#1 Directory 20631TIS4, PC#1 Transferring Data File Name 20631TIS5, and PC#2 Directory 20631TIS6 therefrom (S2). Personal Computer PC#1 then retrieves the transferring data selected in S6 of FIG. 688 from its storage area (not shown in the drawings) (S3), and produces PC#1 Transferring Data PC#1TD (S4). The data included in Produce PC#1 Transferring Data PC#1TD are described in FIG. 692*a*. Personal Computer PC#1 stores PC#1 Transferring Data PC#1TD in PC#1 Uploading Data Storage Area PC#1-31*b*1 (FIG. 680) (S5). PC#1 Transferring Data PC#1TD is retrieved and sent to Personal Computer PC#2 (FIGS. 671 and/or 672) thereafter (S6).

FIG. 692*a* illustrates the data included in PC#1 Transferring Data PC#1TD (FIG. 692). As described in FIG. 692*a*, PC#1 Transferring Data PC#1TD includes Communication Device ID PC#1TD1, Personal Computer PC#1 ID PC#1TD2, Personal Computer PC#2 ID PC#1TD3, PC#1 Directory PC#1TD4, PC#1 Transferring Data File Name PC#1TD5, PC#2 Directory PC#1TD6, and PC#1 Store Data PC#1TD7. Communication Device ID PC#1TD1 is the identification of Communication Device 200. Personal Computer PC#1 ID PC#1TD2 is the identification of Personal Computer PC#1(FIGS. 671 and/or 672). Personal Computer PC#2 ID PC#1TD3 is the identification of Personal Computer PC#2 (FIGS. 671 and/or 672). PC#1 Directory PC#1TD4 is an identification of the directory of Personal Computer PC#1 in which the transferring data selected in S6 of FIG. 688 is stored. PC#1 Transferring Data File Name PC#1TD5 is an identification of the transferring data selected in S6 of FIG. 688. PC#2 Directory PC#1TD6 is an identification of the directory of Personal Computer PC#2 in which the transferring data sent from Personal Computer PC#1 is to be stored. PC#1 Transferring Data PC#1TD7 is the data retrieved in S3 of FIG. 692.

FIG. 693 illustrates the software program stored in PC#2 Remote Downloading Software Storage Area PC#2-31*c* (FIG. 683) of Personal Computer PC#2 (FIGS. 671 and/or 672) which receives the transferring data selected in S6 of FIG. 688 sent from Personal Computer PC#1 (FIGS. 671 and/or 672). Upon receiving PC#1 Transferring Data PC#1TD (FIG. 692*a*) (S1), Personal Computer PC#2 stores the data to PC#2 Downloading Data Storage Area PC#2-31*b*1 (FIG. 684) (S2). Personal Computer PC#2 retrieves PC#2 Directory PC#1TD6 from PC#1 Transferring Data PC#1TD (S3), and further retrieves PC#1 Transferring Data PC#1TD7 therefrom (S4). Personal Computer PC#2 stores PC#1 Transferring Data PC#1TD7 to the directory identified by PC#2 Directory PC#1TD6 retrieved in S3 (S5), and sends to Communication Device 200 a data transfer completion signal which indicates that the transferring data has been received and stored in Personal Computer PC#2.

<<PC Remote Downloading Function—Other Embodiments>>

As another embodiment, all software programs described hereinbefore to implement the present function, i.e., the software programs stored in PC Remote Downloading Software Storage Area 20631*c* (FIG. 674) of Communication Device 200, PC#1 Remote Downloading Software Storage Area PC#1-31*c* (FIG. 679) of Personal Computer PC#1 (FIGS. 671 and/or 672), and PC#2 Remote Downloading Software Storage Area PC#2-31*c* (FIG. 683) of Personal Computer PC#2 (FIGS. 671 and/or 672), may be stored and executed from Host H (FIG. 429).

As another embodiment, one of the following three may be stored and executed from Host H: the software programs stored in PC Remote Downloading Software Storage Area 20631*c* (FIG. 674) of Communication Device 200, PC#1 Remote Downloading Software Storage Area PC#1-31*c* (FIG. 679) of Personal Computer PC#1 (FIGS. 671 and/or 672), and PC#2 Remote Downloading Software Storage Area PC#2-31*c* (FIG. 683) of Personal Computer PC#2 (FIGS. 671 and/or 672). As another embodiment, two of the foregoing three may be stored and executed from Host H.

FIGS. 694 through 697 illustrate another embodiment of the software program described in FIG. 688.

FIG. 694 illustrates both the software program stored in PC Remote Downloading Software Storage Area 20631*c* (FIG. 674) of Communication Device 200 and the software program stored in PC#1 Remote Downloading Software Storage Area PC#1-31*c* (FIG. 679) of Personal Computer PC#1 (FIGS. 671 and/or 672) which displays on LCD 201 (FIG. 1) the image data displayed on the monitor of Personal Computer #1. Referring to FIG. 694, CPU 211 (FIG. 1) of Communication Device 200 sends a display data request to Personal Computer PC#1 (FIGS. 671 and/or 672). Here, the display data request is a request to send the image data displayed on the monitor of Personal Computer #1. Upon receiving the display data request, Personal Computer PC#1 retrieves the PC#1 display data which represents the image data displayed on the monitor of Personal Computer #1 from PC#1 Display Data Storage Area PC#1-31*b*2 (FIG. 680) (S2). The PC#1 display data is sent by Personal Computer PC#1 (S3), which is received by Communication Device 200 (S4).

CPU 211 of Communication Device 200 stores the PC#1 display data to PC#1 Display Data Storage Area 20631*b*2*a* (FIG. 676) (S5).

FIG. 695 illustrates the software program stored in PC Remote Downloading Software Storage Area 20631*c* (FIG. 674) of Communication Device 200. Referring to FIG. 695, CPU 211 (FIG. 1) of Communication Device 200 retrieves the PC#1 display data from PC#1 Display Data Storage Area 20631*b*2*a* (FIG. 676) and displays the data on LCD 201 (FIG. 1) (S1). A certain directory is selected by the input signal data produced by utilizing Input Device 210 (FIG. 1) or via voice recognition system (S2), and the input signal data is stored in Input Signal Data Storage Area 20631*b*3 (FIG. 675) (S3). CPU 211 then retrieves and sends the input signal data to Personal Computer PC#1 (S4).

FIG. 696 illustrates the software program stored in PC#1 Remote Downloading Software Storage Area PC#1-31*c* (FIG. 679) of Personal Computer PC#1 (FIGS. 671 and/or 672) which processes with the input signal data received from Communication Device 200. Referring to FIG. 696, Personal Computer PC#1 receives the input signal data from Communication Device 200 sent in S4 of FIG. 695 (S1). Personal Computer PC#1 stores the input signal data in PC#1 Input Signal Data Storage Area PC#1-31*b*3 (FIG. 680) (S2). Personal Computer PC#1 processes with the input signal data as if the input signal data is input via its input device (e.g., keyboard and mouse) (S3). The process in the present example is to highlight and/or open the directory selected in S2 of FIG. 695. After the process in S3 is completed, the image data displayed on the monitor of Personal Computer PC#1 reflecting the process in S3 is stored in PC#1 Display Data Storage Area PC#1-31*b*2 (FIG. 680) (S4). Personal Computer PC#1 retrieves the PC#1 display data from PC#1 Display Data Storage Area PC#1-31*b*2 (S5), and sends the data to Communication Device 200 (S6).

FIG. 697 illustrates the software program stored in PC Remote Downloading Software Storage Area 20631*c* (FIG. 674) of Communication Device 200. Referring to FIG. 697, CPU 211 (FIG. 1) of Communication Device 200 receives the PC#1 display data (S1) and stores the data to PC#1 Display Data Storage Area 20631*b*2*a* (FIG. 676) thereafter (S2).

The sequence described in FIGS. 695 through 697 is repeated for each input signal data produced by utilizing Input Device 210 (FIG. 1) or via voice recognition system. The following description is based on the assumption which the user of Communication Device 200 is selecting the transferring data stored in the directory selected in S2 of FIG. 695 hereinbefore.

Referring to FIG. 695, CPU 211 (FIG. 1) of Communication Device 200 retrieves the PC#1 display data from PC#1 Display Data Storage Area 20631*b*2*a* (FIG. 676) and displays the data on LCD 201 (FIG. 1) (S1). A transferring data which is to be transferred to Personal Computer PC#2 (FIGS. 671 and/or 672) stored in the directory selected in S2 of FIG. 695 hereinbefore is selected by the input signal data produced by utilizing Input Device 210 (FIG. 1) or via voice recognition system (S2), and the input signal data is stored in Input Signal Data Storage Area 20631*b*3 (FIG. 675) (S3). CPU 211 then retrieves and sends the input signal data to Personal Computer PC#1 (FIGS. 671 and/or 672) (S4). Referring to FIG. 696, Personal Computer PC#1 receives the input signal data from Communication Device 200 sent in S4 of FIG. 695 (S1). Personal Computer PC#1 stores the input signal data in PC#1 Input Signal Data Storage Area PC#1-31*b*3 (FIG. 680) (S2). Personal Computer PC#1 processes with the input signal data as if the input signal data is input via its input device (e.g., keyboard and mouse) (S3). The process described in S3 in the present example is to select the transferring data identified in S2 of FIG. 695. After the process in S3 is completed, the image data displayed on the monitor of Personal Computer PC#1 reflecting the process in S3 is stored in PC#1 Display Data Storage Area PC#1-31*b*2 (FIG. 680) (S4). Personal Computer PC#1 retrieves the PC#1 display data from PC#1 Display Data Storage Area PC#1-31*b*2 (S5), and sends the data to Communication Device 200 (S6). Referring to FIG. 697, CPU 211 (FIG. 1) of Communication Device 200 receives the PC#1 display data (S1) and stores the data to PC#1 Display Data Storage Area 20631*b*2*a* (FIG. 676) thereafter (S2).

FIGS. 698 through 701 illustrate another embodiment of the software program described in FIG. 689.

FIG. 698 illustrates both the software program stored in PC Remote Downloading Software Storage Area 20631*c* (FIG. 674) of Communication Device 200 and the software program stored in PC#2 Remote Downloading Software Storage Area PC#2-31*c* (FIG. 683) of Personal Computer PC#2 (FIGS. 671 and/or 672) which displays on LCD 201 (FIG. 1) the image data displayed on the monitor of Personal Computer #2. Referring to FIG. 698, CPU 211 (FIG. 1) of Communication Device 200 sends a display data request to Personal Computer PC#2. Here, the display data request is a request to send the image data displayed on the monitor of Personal Computer #2. Upon receiving the display data request, Personal Computer PC#2 retrieves the PC#2 display data which represents the image data displayed on the monitor of Personal Computer #2 from PC#2 Display Data Storage Area PC#2-31*b*2 (FIG. 684) (S2). The PC#2 display data is sent from Personal Computer PC#2 (S3), which is received by Communication Device 200 (S4). CPU 211 of Communication Device 200 stores the PC#2 display data to PC#2 Display Data Storage Area 20631*b*2*b* (FIG. 676) (S5).

FIG. 699 illustrates the software program stored in PC Remote Downloading Software Storage Area 20631*c* (FIG. 674) of Communication Device 200. Referring to FIG. 699, CPU 211 (FIG. 1) of Communication Device 200 retrieves the PC#2 display data from PC#2 Display Data Storage Area 20631*b*2*b* (FIG. 676) and displays the data on LCD 201 (FIG. 1) (S1). A certain directory is selected by the input signal data produced by utilizing Input Device 210 (FIG. 1) or via voice recognition system (S2), and the input signal data is stored in Input Signal Data Storage Area 20631*b*3 (FIG. 675) (S3). CPU 211 then retrieves and sends the input signal data to Personal Computer PC#2 (S4).

FIG. 700 illustrates the software program stored in PC#2 Remote Downloading Software Storage Area PC#2-31*c* (FIG. 683) of Personal Computer PC#2 (FIGS. 671 and/or 672) which processes with the input signal data received from Communication Device 200. Referring to FIG. 700, Personal Computer PC#2 receives the input signal data from Communication Device 200 sent in S4 of FIG. 699 (S1). Personal Computer PC#2 stores the input signal data in PC#2 Input Signal Data Storage Area PC#2-31*b*3 (FIG. 684) (S2). Personal Computer PC#2 processes with the input signal as if the input signal data is input via its input device (e.g., keyboard and mouse) (S3). The process in the present example is to highlight and/or open the directory selected in S2 of FIG. 699. After the process in S3 is completed, the image data displayed on the monitor of Personal Computer PC#2 reflecting the process in S3 is stored in PC#2 Display Data Storage Area PC#2-31*b*2 (FIG. 684) (S4). Personal Computer PC#2 retrieves the PC#2 display data from PC#2 Display Data Storage Area PC#2-31*b*2 (S5), and sends the data to Communication Device 200 (S6).

FIG. 701 illustrates the software program stored in PC Remote Downloading Software Storage Area 20631*c* (FIG. 674) of Communication Device 200. Referring to FIG. 701, CPU 211 (FIG. 1) of Communication Device 200 receives the PC#2 display data (S1) and stores the data to PC#2 Display Data Storage Area 20631*b*2*b* (FIG. 676) thereafter (S2).

The sequence described in FIGS. 695 through 697 may be utilized to send the transferring data from Personal Computer PC#1 to Personal Computer PC#2.

Referring to FIG. 695, CPU 211 (FIG. 1) of Communication Device 200 retrieves the PC#1 display data from PC#1 Display Data Storage Area 20631*b*2*a* (FIG. 676) and displays the data on LCD 201 (FIG. 1) (S1). An input signal data instructing Personal Computer PC#1 (FIGS. 671 and/or 672) to transfer the transferring data selected hereinbefore to Personal Computer PC#2 (FIGS. 671 and/or 672) is input by utilizing Input Device 210 (FIG. 1) or via voice recognition system (S2), and the input signal data is stored in Input Signal Data Storage Area 20631*b*3 (FIG. 675) (S3). CPU 211 then retrieves and sends the input signal data to Personal Computer PC#1 (S4). Referring to FIG. 696, Personal Computer PC#1 receives the input signal data from Communication Device 200 sent in S4 of FIG. 695 (S1). Personal Computer PC#1 stores the input signal data in PC#1 Input Signal Data Storage Area PC#1-31*b*3 (FIG. 680) (S2). Personal Computer PC#1 processes with the input signal data as if the input signal data is input via its input device (e.g., keyboard and mouse) (S3). The process described in S3 is to transfer the transferring data identified hereinbefore. After the process in S3 is completed, the image data displayed on the monitor of Personal Computer PC#1 reflecting the process in S3 is stored in PC#1 Display Data Storage Area PC#1-31*b*2 (FIG. 680) (S4). Personal Computer PC#1 retrieves the PC#1 display data from PC#1 Display Data Storage Area PC#1-31*b*2 (S5), and sends the data to Communication Device 200 (S6). Referring to FIG. 697, CPU 211 (FIG. 1) of Communication Device 200 receives the PC#1 display data (S1) and stores the data to PC#1 Display Data Storage Area 20631*b*2*a* (FIG. 676) thereafter (S2). The sequence described in FIG. 693 is initiated by Personal Computer PC#2 (FIGS. 671 and/or 672) thereafter.

<<PC Remote Downloading Function—Summary>>

(1) A remote downloading system comprising a communication device, a first personal computer, and a second personal computer, wherein said communication device and said first personal computer are capable to intercommunicate, said first personal computer and said second computer are capable to intercommunicate, said communication device sends a data transfer request to said first personal computer, said first personal computer retrieves a transferring data stored therein, and said first personal computer sends said transferring data to said second personal computer.

(2) A communication device comprising a display and an input device, wherein a list of personal computers is displayed on said display, a first personal computer which stores and sends a transferring data is selected from said list by utilizing said input device, a second personal computer which receives said transferring data is selected from said list by utilizing said input device, said communication device identifies the location of said transferring data in said first personal computer, and said communication device sends a data transfer request to said first personal computer, thereby said first personal computer sends said transferring data to said second personal computer in accordance with said data transfer request.

(3) A remote downloading software program wherein a list of personal computers is displayed on a display of a communication device under the control of said remote downloading software program, a first personal computer which stores and sends a transferring data is selected from said list by an input device of said communication device under the control of said remote downloading software program, a second personal computer which receives said transferring data is selected from said list by said input device under the control of said remote downloading software program, said communication device identifies the location of said transferring data in said first personal computer under the control of said remote downloading software program, and said communication device sends a data transfer request to said first personal computer under the control of said remote downloading software program, thereby said first personal computer sends said transferring data to said second personal computer in accordance with said data transfer request.

<<Audiovisual Playback Function>>

FIGS. 702 through 716 illustrate the audiovisual playback function which enables Communication Device 200 to playback audiovisual data, such as movies, soap operas, situation comedies, news, and any type of TV programs.

FIG. 702 illustrates the information stored in RAM 206 (FIG. 1). As described in FIG. 702, RAM 206 includes Audiovisual Playback Information Storage Area 20632*a* of which the information stored therein are described in FIG. 703.

The data and software programs necessary to implement the present function are downloaded to Communication Device 200 from Host H (FIG. 429) in the manner described in FIGS. 401 through 407.

FIG. 703 illustrates the data and software programs stored in Audiovisual Playback Information Storage Area 20632*a* (FIG. 702). As described in FIG. 703, Audiovisual Playback Information Storage Area 20632*a* includes Audiovisual Playback Data Storage Area 20632*b* and Audiovisual Playback Software Storage Area 20632*c*. Audiovisual Playback Data Storage Area 20632*b* stores the data necessary to implement the present function, such as the ones described in FIGS. 704 through 706. Audiovisual Playback Software Storage Area 20632*c* stores the software programs necessary to implement the present function, such as the ones described in FIG. 707.

FIG. 704 illustrates the data stored in Audiovisual Playback Data Storage Area 20632*b* (FIG. 703). As described in FIG. 704, Audiovisual Playback Data Storage Area 20632*b* includes Audiovisual Data Storage Area 20632*b*1 and Message Data Storage Area 20632*b*2. Audiovisual Data Storage Area 20632*b*1 stores a plurality of audiovisual data described in FIG. 705. Message Data Storage Area 20632*b*2 stores a plurality of message data described in FIG. 706.

FIG. 705 illustrates the audiovisual data stored in Audiovisual Data Storage Area 20632*b*1 (FIG. 704). As described in FIG. 705, Audiovisual Data Storage Area 20632*b*1 stores a plurality of audiovisual data wherein the audiovisual data stored therein in the present example are: Audiovisual Data 20632*b*1*a*, Audiovisual Data 20632*b*1*b*, Audiovisual Data 20632*b*1*c*, and Audiovisual Data 20632*b*1*d*, all of which are primarily composed of video data and audio data. Audiovisual Data 20632*b*1*a* is a movie, Audiovisual Data 20632*b*1*b* is a soap opera, Audiovisual Data 20632*b*1*c* is a situation comedy, Audiovisual Data 20632*b*1*d* is TV news in the present embodiment. The data stored in Audiovisual Data Storage Area 20632*b*1 may be the same or similar to the ones described in TV Data Storage Area 206*f* (FIG. 99) and/or Video Data Storage Area 20610*c* (FIG. 228). As another embodiment, Audiovisual Data 20632*b*1*d* may be an audiovisual data taken via CCD Unit 214 (FIG. 1) and Microphone 215 (FIG. 1).

FIG. 706 illustrates the data stored in Message Data Storage Area 20632*b*2 (FIG. 704). As described in FIG. 706, Message Data Storage Area **20632*b*2 includes Start Message Text Data 20632*b*2*a*, Stop Message Text Data 20632*b*2*b*, Pause Message Text Data 20632*b*2*c*, Resume Message Text Data 20632*b*2*c*1, Slow Replay Message Text Data 20632*b*2*d*, Forward Message Text Data 20632*b*2*e*, Rewind Message Text Data 20632*b*2*f*, Next Message Text Data 20632*b*2*g*, and Previous Message Text Data 20632*b*2*h*. Start Message Text Data 20632*b*2*a* is a text data which is displayed on LCD 201 (FIG. 1) and which indicates that the playback of an audiovisual data is initiated. Stop Message Text Data 20632*b*2*b* is a text data which is displayed on LCD 201 and which indicates that the playback process of an audiovisual data is stopped. Pause Message Text Data 20632*b*2*c* is a text data which is displayed on LCD 201 and which indicates that the playback process of an audiovisual data is paused. Resume Message Text Data 20632*b*2*c*1 is a text data which is displayed on LCD 201 and which indicates that the playback process of an audiovisual data is resumed from the point it is paused. Slow Replay Message Text Data 20632*b*2*d* is a text data which is displayed on LCD 201 and which indicates that the playback process of an audiovisual data is implemented in a slow motion. Fast-Forward Message Text Data 20632*b*2*e* is a text data which is displayed on LCD 201 and which indicates that an audiovisual data is fast-forwarded. Fast-Rewind Message Text Data 20632*b*2*f* is a text data which is displayed on LCD 201 and which indicates that an audiovisual data is fast-rewinded. Next Message Text Data 20632*b*2*g* is a text data which is displayed on LCD 201 and which indicates that the playback process of the next audiovisual data stored in Audiovisual Data Storage Area 20632*b*1 (FIG. 705) is initiated. Previous Message Text Data 20632*b*2*h* is a text data which is displayed on LCD 201 and which indicates that the playback process of the previous audiovisual data stored in Audiovisual Data Storage Area 20632*b*1 (FIG. 705**) is initiated.

FIG. 707 illustrates the software programs stored in Audiovisual Playback Software Storage Area **20632*c* (FIG. 703). As described in FIG. 707, Audiovisual Playback Software Storage Area 20632*c* includes Audiovisual Start Software 20632*c*1, Audiovisual Stop Software 20632*c*2, Audiovisual Pause Software 20632*c*3, Audiovisual Resume Software 20632*c*3*a*, Audiovisual Slow Replay Software 20632*c*4, Audiovisual Fast-Forward Software 20632*c*5, Audiovisual Fast-Rewind Software 20632*c*6, Audiovisual Next Software 20632*c*7, and Audiovisual Previous Software 20632*c*8. Audiovisual Start Software 20632*c*1 is a software program which initiates the playback process of an audiovisual data. Audiovisual Stop Software 20632*c*2 is a software program which stops the playback process of an audiovisual data. Audiovisual Pause Software 20632*c*3 is a software program which pauses the playback process of an audiovisual data. Audiovisual Resume Software 20632*c*3*a* is a software program which resumes the playback process of the audiovisual data from the point it is paused by Audiovisual Pause Software 20632*c*3. Audiovisual Slow Replay Software 20632*c*4 is a software program which implements the playback process of an audiovisual data in a slow motion. Audiovisual Fast-Forward Software 20632*c*5 is a software program which fast-forwards an audiovisual data. Audiovisual Fast-Rewind Software 20632*c*6 is a software program which fast-rewinds an audiovisual data. Audiovisual Next Software 20632*c*7 is a software program which initiates the playback process of the next audiovisual data stored in Audiovisual Data Storage Area 20632*b*1 (FIG. 705). Audiovisual Previous Software 20632*c*8 is a software program which initiates the playback process of the previous audiovisual data stored in Audiovisual Data Storage Area 20632*b*1**.

FIG. 708 illustrates the messages displayed on LCD 201 (FIG. 1). As described in FIG. 708, eight types of messages are displayed on LCD 201, i.e., ‘Start’, ‘Stop’, ‘Pause’, ‘Resume’, ‘Slow Reply’, ‘Fast-Forward’, ‘Fast-Rewind’, ‘Next’, and ‘Previous’. ‘Start’ is Start Message Text Data **20632*b*2*a*, ‘Stop’ is Stop Message Text Data 20632*b*2*b*, ‘Pause’ is Pause Message Text Data 20632*b*2*c*, ‘Resume’ is Resume Message Text Data 20632*b*2*c*1, ‘Slow Reply’ is Slow Replay Message Text Data 20632*b*2*d*, ‘Fast-Forward’ is Fast-Forward Message Text Data 20632*b*2*e*, ‘Fast-Rewind’ is Fast-Rewind Message Text Data 20632*b*2*f*, ‘Next’ is Next Message Text Data 20632*b*2*g*, ‘Previous’ is Previous Message Text Data 20632*b*2*h* described in FIG. 706** hereinbefore.

FIG. **708*a* illustrates Audiovisual Selecting Software 20632*c*9 stored in Audiovisual Playback Software Storage Area 20632*c* (FIG. 703) in preparation of executing the software programs described in FIGS. 709 through 716. Referring to FIG. 708*a*, CPU 211 (FIG. 1) retrieves the identifications of the audiovisual data stored in Audiovisual Data Storage Area 20632*b*1 (FIG. 705) (S1). CPU 211 then displays a list of the identifications on LCD 201 (FIG. 1) (S2). A particular audiovisual data is selected by utilizing Input Device 210 (FIG. 1) or via voice recognition system (S3**).

FIGS. 709 through 716 illustrates the software programs stored in Audiovisual Playback Software Storage Area **20632*c* (FIG. 703). As described in each drawing figure hereinafter, nine types of input signals can be input by utilizing Input Device 210 (FIG. 1) or via voice recognition system, i.e., the audiovisual playback signal, the audiovisual stop signal, the audiovisual pause signal, the audiovisual resume signal, the audiovisual slow replay signal, the audiovisual fast-forward signal, the audiovisual fast-rewind signal, the audiovisual next signal, and the audiovisual previous signal. The audiovisual playback signal indicates to initiate the playback process of the audiovisual data selected in S3 of FIG. 708*a*. The audiovisual stop signal indicates to stop the playback process of the audiovisual data selected in S3 of FIG. 708*a*. The audiovisual pause signal indicates to pause the playback process of the audiovisual data selected in S3 of FIG. 708*a*. The audiovisual resume signal indicates to resume the playback process of the audiovisual data selected in S3 of FIG. 708*a* from the point the audio data is paused. The audiovisual slow replay signal indicates to implement the playback process of the audiovisual data selected in S3 of FIG. 708*a* in a slow motion. The audiovisual fast-forward signal indicates to fast-forward the audiovisual data selected in S3 of FIG. 708*a*. The audiovisual fast-rewind signal indicates to fast-rewind the audiovisual data selected in S3 of FIG. 708*a*. The audiovisual next signal indicates to initiate the playback process of the next audiovisual data of the audiovisual data selected in S3 of FIG. 708*a* both of which are stored in Audiovisual Data Storage Area 20632*b*1 (FIG. 705). The audiovisual previous signal indicates to initiate the playback process of the previous audiovisual data of the audiovisual data selected in S3 of FIG. 708*a* both of which are stored in Audiovisual Data Storage Area 20632*b*1**.

FIG. 709 illustrates Audiovisual Start Software **20632*c*1 stored in Audiovisual Playback Software Storage Area 20632*c* (FIG. 703) which initiates the playback process of the audiovisual data selected in S3 of FIG. 708*a*. Referring to FIG. 709, the audiovisual playback signal is input by utilizing Input Device 210 (FIG. 1) or via voice recognition system (S1). CPU 211 (FIG. 1) then initiates the playback process (i.e., outputs the audio data from Speaker 216 (FIG. 1) and display the video data on LCD 201 (FIG. 1)) of the audiovisual data selected in S3 of FIG. 708*a* (S2), and retrieves Start Message Text Data 20632*b*2*a* from Message Data Storage Area 20632*b*2 (FIG. 704) and displays the data on LCD 201 (FIG. 1) for a specified period of time (S3**).

FIG. 710 illustrates Audiovisual Stop Software **20632*c*2 stored in Audiovisual Playback Software Storage Area 20632*c* (FIG. 703) which stops the playback process of the audiovisual data selected in S3 of FIG. 708*a*. Referring to FIG. 710, the audiovisual stop signal is input by utilizing Input Device 210 (FIG. 1) or via voice recognition system (S1). CPU 211 (FIG. 1) then stops the playback process of the audiovisual data selected in S3 of FIG. 708*a* (S2), and retrieves Stop Message Text Data 20632*b*2*b* from Message Data Storage Area 20632*b*2 (FIG. 704) and displays the data on LCD 201 (FIG. 1) for a specified period of time (S3**).

FIG. 711 illustrates Audiovisual Pause Software **20632*c*3 stored in Audiovisual Playback Software Storage Area 20632*c* (FIG. 703) which pauses the playback process of the audiovisual data selected in S3 of FIG. 708*a*. Referring to FIG. 711, the audiovisual pause signal is input by utilizing Input Device 210 (FIG. 1) or via voice recognition system (S1). CPU 211 (FIG. 1) then pauses the playback process of the audiovisual data selected in S3 of FIG. 708*a* (S2), and retrieves Pause Message Text Data 20632*b*2*c* from Message Data Storage Area 20632*b*2 (FIG. 704) and displays the data on LCD 201 (FIG. 1) for a specified period of time (S3) When the playback process is paused in S2, the audio data included in the audiovisual data is refrained from being output from Speaker 216 (FIG. 1) and a still image composing the video data included in the audiovisual data is displayed on LCD 201 (FIG. 1**).

FIG. **711*a* illustrates Audiovisual Resume Software 20632*c*3*a* stored in Audiovisual Playback Software Storage Area 20632*c* (FIG. 703) which resumes the playback process of the audiovisual data selected in S3 of FIG. 708*a* from the point the audiovisual data is paused in S2 of FIG. 711. Referring to FIG. 711*a*, the audiovisual resume signal is input by utilizing Input Device 210 (FIG. 1) or via voice recognition system (S1). CPU 211 (FIG. 1) then resumes the playback process of the audiovisual data selected in S3 of FIG. 708*a* (S2) from the point it is paused in S2 of FIG. 711, and retrieves Resume Message Text Data 20632*b*2*c*1 from Message Data Storage Area 20632*b*2 (FIG. 704) and displays the data on LCD 201 (FIG. 1) for a specified period of time (S3) When the playback process is resumed in S2, the audio data included in the audiovisual data is resumed to be output from Speaker 216 (FIG. 1) and the video data included in the audiovisual data is resumed to be displayed on LCD 201 (FIG. 1**).

FIG. 712 illustrates Audiovisual Slow Replay Software **20632*c*4 stored in Audiovisual Playback Software Storage Area 20632*c* (FIG. 703) which implements the playback process of the audiovisual data selected in S3 of FIG. 708*a* in a slow motion. Referring to FIG. 712, the audiovisual slow replay signal is input by utilizing Input Device 210 (FIG. 1) or via voice recognition system (S1). CPU 211 (FIG. 1) then initiates the playback process of the audiovisual data selected in S3 of FIG. 708*a* in a slow motion (S2), and retrieves Slow Replay Message Text Data 20632*b*2*d* from Message Data Storage Area 20632*b*2 (FIG. 704) and displays the data on LCD 201 (FIG. 1) for a specified period of time (S3**).

FIG. 713 illustrates Audiovisual Fast-Forward Software **20632*c*5 stored in Audiovisual Playback Software Storage Area 20632*c* (FIG. 703) which fast-forwards the audiovisual data selected in S3 of FIG. 708*a*. Referring to FIG. 713, the audiovisual fast-forward signal is input by utilizing Input Device 210 (FIG. 1) or via voice recognition system (S1). CPU 211 (FIG. 1) then fast-forwards the audiovisual data selected in S3 of FIG. 708*a* (S2), and retrieves Fast-Forward Message Text Data 20632*b*2*e* from Message Data Storage Area 20632*b*2 (FIG. 704) and displays the data on LCD 201 (FIG. 1) for a specified period of time (S3**).

FIG. 714 illustrates Audiovisual Fast-Rewind Software **20632*c*6 stored in Audiovisual Playback Software Storage Area 20632*c* (FIG. 703) which fast-rewinds the audiovisual data selected in S3 of FIG. 708*a*. Referring to FIG. 714, the audiovisual fast-rewind signal is input by utilizing Input Device 210 (FIG. 1) or via voice recognition system (S1). CPU 211 (FIG. 1) then fast-rewinds the audiovisual data selected in S3 of FIG. 708*a* (S2), and retrieves Fast-Rewind Message Text Data 20632*b*2*f* from Message Data Storage Area 20632*b*2 (FIG. 704) and displays the data on LCD 201 (FIG. 1) for a specified period of time (S3**).

FIG. 715 illustrates Audiovisual Next Software **20632*c*7 stored in Audiovisual Playback Software Storage Area 20632*c* (FIG. 703) which initiates the playback process of the next audiovisual data stored in Audiovisual Data Storage Area 20632*b*1 (FIG. 705). Referring to FIG. 715, the audiovisual next signal is input by utilizing Input Device 210 (FIG. 1) or via voice recognition system (S1). CPU 211 (FIG. 1) then initiates the playback process of the next audiovisual data of the audiovisual data selected in S3 of FIG. 708*a* both of which are stored in Audiovisual Data Storage Area 20632*b*1 (FIG. 705) (S2), and retrieves Next Message Text Data 20632*b*2*g* from Message Data Storage Area 20632*b*2 (FIG. 704) and displays the data on LCD 201 (FIG. 1) for a specified period of time (S3**).

FIG. 716 illustrates Audiovisual Previous Software **20632*c*8 is a software program which initiates the playback process of the previous audiovisual data stored in Audiovisual Data Storage Area 20632*b*1 (FIG. 705). Referring to FIG. 716, the audiovisual previous signal is input by utilizing Input Device 210 (FIG. 1) or via voice recognition system (S1). CPU 211 (FIG. 1) then initiates the playback process of the previous audiovisual data of the audiovisual data selected in S3 of FIG. 708*a* both of which are stored in Audiovisual Data Storage Area 20632*b*1 (FIG. 705) (S2), and retrieves Previous Message Text Data 20632*b*2*h* from Message Data Storage Area 20632*b*2 (FIG. 704) and displays the data on LCD 201 (FIG. 1) for a specified period of time (S3**).

As another embodiment, the audiovisual data stored in Audiovisual Data Storage Area **20632*b*1 (FIG. 705) may be stored in Host H (FIG. 429) and retrieved therefrom when the software programs described in FIGS. 709 through 716 are executed. In this embodiment, the audio data is temporarily stored in RAM 206 (FIG. 1**) and is erased from the portion which is playbacked.

<<Audiovisual Playback Function—Summary>>

(1) A communication device comprising a microphone, a speaker, a display, an input device and a multiple mode implementor, wherein said multiple mode implementor implements a voice communication mode and an audiovisual playback mode, a series of sound data are input to and output from said microphone and said speaker respectively when said voice communication mode is implemented, an audio data is output from said speaker and a video data is output from said display when said audiovisual playback mode is implemented, and said audio data is refrained from being output from said speaker and a still image is output from said display when an audiovisual pause signal is input via said input device.

(2) The wireless communication device of Summary (1) wherein said audiovisual data is resumed to playback from the point said audiovisual data is paused when an audiovisual resume signal is input via said input device.

(2) An audiovisual playback software program installed in a communication device comprising a microphone, a speaker, a display, an input device and a multiple mode implementor, wherein said multiple mode implementor implements a voice communication mode and an audiovisual playback mode, a series of sound data are input to and output from said microphone and said speaker respectively when said voice communication mode is implemented, an audio data is output from said speaker and a video data is output from said display under the control of said audiovisual playback software program when said audiovisual playback mode is implemented, and said audio data is refrained from being output from said speaker and a still image is output from said display under the control of said audiovisual playback software program when an audiovisual pause signal is input via said input device.

<<Audio Playback Function>>

FIGS. 717 through 731 illustrate the audio playback function which enables Communication Device 200 to playback audio data, such as jazz music, rock music, classic music, pops music, and any other types of audio data.

FIG. 717 illustrates the information stored in RAM 206 (FIG. 1). As described in FIG. 717, RAM 206 includes Audio Playback Information Storage Area 20633*a* of which the information stored therein are described in FIG. 718.

The data and software programs necessary to implement the present function are downloaded to Communication Device 200 from Host H (FIG. 429) in the manner described in FIGS. 401 through 407.

FIG. 718 illustrates the data and software programs stored in Audio Playback Information Storage Area 20633*a* (FIG. 717). As described in FIG. 718, Audio Playback Information Storage Area 20633*a* includes Audio Playback Data Storage Area 20633*b* and Audio Playback Software Storage Area 20633*c*. Audio Playback Data Storage Area 20633*b* stores the data necessary to implement the present function, such as the ones described in FIGS. 719 through 721. Audio Playback Software Storage Area 20633*c* stores the software programs necessary to implement the present function, such as the ones described in FIG. 722.

FIG. 719 illustrates the data stored in Audio Playback Data Storage Area 20633*b* (FIG. 718). As described in FIG. 719, Audio Playback Data Storage Area 20633*b* includes Audio Data Storage Area 20633*b*1 and Message Data Storage Area 20633*b*2. Audio Data Storage Area 20633*b*1 stores a plurality of audio data described in FIG. 720. Message Data Storage Area 20633*b*2 stores a plurality of message data described in FIG. 721.

FIG. 720 illustrates the audio data stored in Audio Data Storage Area 20633*b*1 (FIG. 719). As described in FIG. 720, Audio Data Storage Area 20633*b*1 stores a plurality of audio data wherein the audio data stored therein in the present example are: Audio Data 20633*b*1*a*, Audio Data 20633*b*1*b*, Audio Data 20633*b*1*c*, and Audio Data 20633*b*1*d*, all of which are primarily composed of video data and audio data. Audio Data 20633*b*1*a* is a jazz music, Audio Data 20633*b*1*b* is a rock music, Audio Data 20633*b*1*c* is a classic music, Audio Data 20633*b*1*d* is a pops music in the present embodiment. The data stored in Audio Data Storage Area 20633*b*1 may be the same or similar to the ones described in TV Data Storage Area 206*f* (FIG. 99) and/or Video Data Storage Area 20610*c* (FIG. 228). As another embodiment, Audio Data 20633*b*1*d* may be an audio data taken via CCD Unit 214 (FIG. 1) and Microphone 215 (FIG. 1).

FIG. 721 illustrates the data stored in Message Data Storage Area 20633*b*2 (FIG. 719). As described in FIG. 721, Message Data Storage Area 20633*b*2 includes Start Message Text Data 20633*b*2*a*, Stop Message Text Data 20633*b*2*b*, Pause Message Text Data 20633*b*2*c*, Resume Message Text Data 20633*b*2*c*1, Slow Replay Message Text Data 20633*b*2*d*, Forward Message Text Data 20633*b*2*e*, Rewind Message Text Data 20633*b*2*f*, Next Message Text Data 20633*b*2*g*, and Previous Message Text Data 20633*b*2*h*. Start Message Text Data 20633*b*2*a* is a text data which is displayed on LCD 201 (FIG. 1) and which indicates that the playback of an audio data is initiated. Stop Message Text Data 20633*b*2*b* is a text data which is displayed on LCD 201 and which indicates that the playback process of an audio data is stopped. Pause Message Text Data 20633*b*2*c* is a text data which is displayed on LCD 201 and which indicates that the playback process of an audio data is paused. Resume Message Text Data 20633*b*2*c*1 is a text data which is displayed on LCD 201 and which indicates that the playback process of an audio data is resumed from the point it is paused. Slow Replay Message Text Data 20633*b*2*d* is a text data which is displayed on LCD 201 and which indicates that the playback process of an audio data is implemented in a slow motion. Fast-Forward Message Text Data 20633*b*2*e* is a text data which is displayed on LCD 201 and which indicates that an audio data is fast-forwarded. Fast-Rewind Message Text Data 20633*b*2*f* is a text data which is displayed on LCD 201 and which indicates that an audio data is fast-rewinded. Next Message Text Data 20633*b*2*g* is a text data which is displayed on LCD 201 and which indicates that the playback process of the next audio data stored in Audio Data Storage Area 20633*b*1 (FIG. 720) is initiated. Previous Message Text Data 20633*b*2*h* is a text data which is displayed on LCD 201 and which indicates that the playback process of the previous audio data stored in Audio Data Storage Area 20633*b*1 (FIG. 720) is initiated.

FIG. 722 illustrates the software programs stored in Audio Playback Software Storage Area 20633*c* (FIG. 718). As described in FIG. 722, Audio Playback Software Storage Area 20633*c* includes Audio Start Software 20633*c*1, Audio Stop Software 20633*c*2, Audio Pause Software 20633*c*3, Audio Resume Software 20633*c*3*a*, Audio Slow Replay Software 20633*c*4, Audio Fast-Forward Software 20633*c*5, Audio Fast-Rewind Software 20633*c*6, Audio Next Software 20633*c*7, and Audio Previous Software 20633*c*8. Audio Start Software 20633*c*1 is a software program which initiates the playback process of an audio data. Audio Stop Software 20633*c*2 is a software program which stops the playback process of an audio data. Audio Pause Software 20633*c*3 is a software program which pauses the playback process of an audio data. Audio Resume Software 20633*c*3*a* is a software program which resumes the playback process of the audio data from the point it is paused by Audio Pause Software 20633*c*3. Audio Slow Replay Software 20633*c*4 is a software program which implements the playback process of an audio data in a slow motion. Audio Fast-Forward Software 20633*c*5 is a software program which fast-forwards an audio data. Audio Fast-Rewind Software 20633*c*6 is a software program which fast-rewinds an audio data. Audio Next Software 20633*c*7 is a software program which initiates the playback process of the next audio data stored in Audio Data Storage Area 20633*b*1 (FIG. 720). Audio Previous Software 20633*c*8 is a software program which initiates the playback process of the previous audio data stored in Audio Data Storage Area 20633*b*1.

FIG. 723 illustrates the messages displayed on LCD 201 (FIG. 1). As described in FIG. 723, eight types of messages are displayed on LCD 201, i.e., 'Start', 'Stop', 'Pause', 'Resume', 'Slow Reply', 'Fast-Forward', 'Fast-Rewind', 'Next', and 'Previous'. 'Start' is Start Message Text Data 20633*b*2*a*, 'Stop' is Stop Message Text Data 20633*b*2*b*, 'Pause' is Pause Message Text Data 20633*b*2*c*, 'Resume' is Resume Message Text Data 20633$b$2$c$1, ‘Slow Reply’ is Slow Replay Message Text Data 20633$b$2$d$, ‘Fast-Forward’ is Fast-Forward Message Text Data 20633$b$2$e$, ‘Fast-Rewind’ is Fast-Rewind Message Text Data 20633$b$2$f$, ‘Next’ is Next Message Text Data 20633$b$2$g$, ‘Previous’ is Previous Message Text Data 20633$b$2$h$ described in FIG. 721 hereinbefore.

FIG. 723$a$ illustrates Audio Selecting Software 20633$c$9 stored in Audio Playback Software Storage Area 20633$c$ (FIG. 718) in preparation of executing the software programs described in FIGS. 724 through 731. Referring to FIG. 723$a$, CPU 211 (FIG. 1) retrieves the identifications of the audio data stored in Audio Data Storage Area 20633$b$1 (FIG. 720) (S1). CPU 211 then displays a list of the identifications on LCD 201 (FIG. 1) (S2). A particular audio data is selected by utilizing Input Device 210 (FIG. 1) or via voice recognition system (S3).

FIGS. 724 through 731 illustrates the software programs stored in Audio Playback Software Storage Area 20633$c$ (FIG. 718). As described in each drawing figure hereinafter, eight types of input signals can be input by utilizing Input Device 210 (FIG. 1) or via voice recognition system, i.e., the audio playback signal, the audio stop signal, the audio pause signal, the audio resume signal, the audio slow replay signal, the audio fast-forward signal, the audio fast-rewind signal, the audio next signal, and the audio previous signal. The audio playback signal indicates to initiate the playback process of the audio data selected in S3 of FIG. 723$a$. The audio stop signal indicates to stop the playback process of the audio data selected in S3 of FIG. 723$a$. The audio pause signal indicates to pause the playback process of the audio data selected in S3 of FIG. 723$a$. The audio resume signal indicates to resume the playback process of the audio data selected in S3 of FIG. 723$a$ from the point the audio data is paused. The audio slow replay signal indicates to implement the playback process of the audio data selected in S3 of FIG. 723$a$ in a slow motion. The audio fast-forward signal indicates to fast-forward the audio data selected in S3 of FIG. 723$a$. The audio fast-rewind signal indicates to fast-rewind the audio data selected in S3 of FIG. 723$a$. The audio next signal indicates to initiate the playback process of the next audio data of the audio data selected in S3 of FIG. 723$a$ both of which are stored in Audio Data Storage Area 20633$b$1 (FIG. 720). The audio previous signal indicates to initiate the playback process of the previous audio data of the audio data selected in S3 of FIG. 723$a$ both of which are stored in Audio Data Storage Area 20633$b$1 FIG. 724 illustrates Audio Start Software 20633$c$1 stored in Audio Playback Software Storage Area 20633$c$ (FIG. 718) which initiates the playback process of the audio data selected in S3 of FIG. 723$a$. Referring to FIG. 724, the audio playback signal is input by utilizing Input Device 210 (FIG. 1) or via voice recognition system (S1). CPU 211 (FIG. 1) then initiates the playback process (i.e., outputs the audio data from Speaker 216 (FIG. 1)) of the audio data selected in S3 of FIG. 723$a$ (S2), and retrieves Start Message Text Data 20633$b$2$a$ from Message Data Storage Area 20633$b$2 (FIG. 719) and displays the data on LCD 201 (FIG. 1) for a specified period of time (S3).

FIG. 725 illustrates Audio Stop Software 20633$c$2 stored in Audio Playback Software Storage Area 20633$c$ (FIG. 718) which stops the playback process of the audio data selected in S3 of FIG. 723$a$. Referring to FIG. 725, the audio stop signal is input by utilizing Input Device 210 (FIG. 1) or via voice recognition system (S1). CPU 211 (FIG. 1) then stops the playback process of the audio data selected in S3 of FIG. 723$a$ (S2), and retrieves Stop Message Text Data 20633$b$2$b$ from Message Data Storage Area 20633$b$2 (FIG. 719) and displays the data on LCD 201 (FIG. 1) for a specified period of time (S3).

FIG. 726 illustrates Audio Pause Software 20633$c$3 stored in Audio Playback Software Storage Area 20633$c$ (FIG. 718) which pauses the playback process of the audio data selected in S3 of FIG. 723$a$. Referring to FIG. 726, the audio pause signal is input by utilizing Input Device 210 (FIG. 1) or via voice recognition system (S1). CPU 211 (FIG. 1) then pauses the playback process of the audio data selected in S3 of FIG. 723$a$ (S2), and retrieves Pause Message Text Data 20633$b$2$c$ from Message Data Storage Area 20633$b$2 (FIG. 719) and displays the data on LCD 201 (FIG. 1) for a specified period of time (S3) When the playback process is paused in S2, the audio data included in the audio data is refrained from being output from Speaker 216 (FIG. 1).

FIG. 726$a$ illustrates Audio Resume Software 20633$c$3$a$ stored in Audio Playback Software Storage Area 20633$c$ (FIG. 718) which resumes the playback process of the audio data selected in S3 of FIG. 723$a$ from the point the audiovisual data is paused in S2 of FIG. 726. Referring to FIG. 726$a$, the audio resume signal is input by utilizing Input Device 210 (FIG. 1) or via voice recognition system (S1). CPU 211 (FIG. 1) then resumes the playback process of the audio data selected in S3 of FIG. 723$a$ from the point the audiovisual data is paused in S2 of FIG. 726 (S2), and retrieves Resume Message Text Data 20633$b$2$c$1 from Message Data Storage Area 20633$b$2 (FIG. 719) and displays the data on LCD 201 (FIG. 1) for a specified period of time (S3).

FIG. 727 illustrates Audio Slow Replay Software 20633$c$4 stored in Audio Playback Software Storage Area 20633$c$ (FIG. 718) which implements the playback process of the audio data selected in S3 of FIG. 723$a$ in a slow motion. Referring to FIG. 727, the audio slow replay signal is input by utilizing Input Device 210 (FIG. 1) or via voice recognition system (S1). CPU 211 (FIG. 1) then initiates the playback process of the audio data selected in S3 of FIG. 723$a$ in a slow motion (S2), and retrieves Slow Replay Message Text Data 20633$b$2$d$ from Message Data Storage Area 20633$b$2 (FIG. 719) and displays the data on LCD 201 (FIG. 1) for a specified period of time (S3).

FIG. 728 illustrates Audio Fast-Forward Software 20633$c$5 stored in Audio Playback Software Storage Area 20633$c$ (FIG. 718) which fast-forwards the audio data selected in S3 of FIG. 723$a$. Referring to FIG. 728, the audio fast-forward signal is input by utilizing Input Device 210 (FIG. 1) or via voice recognition system (S1). CPU 211 (FIG. 1) then fast-forwards the audio data selected in S3 of FIG. 723$a$ (S2), and retrieves Fast-Forward Message Text Data 20633$b$2$e$ from Message Data Storage Area 20633$b$2 (FIG. 719) and displays the data on LCD 201 (FIG. 1) for a specified period of time (S3).

FIG. 729 illustrates Audio Fast-Rewind Software 20633$c$6 stored in Audio Playback Software Storage Area 20633$c$ (FIG. 718) which fast-rewinds the audio data selected in S3 of FIG. 723$a$. Referring to FIG. 729, the audio fast-rewind signal is input by utilizing Input Device 210 (FIG. 1) or via voice recognition system (S1). CPU 211 (FIG. 1) then fast-rewinds the audio data selected in S3 of FIG. 723$a$ (S2), and retrieves Fast-Rewind Message Text Data 20633$b$2$f$ from Message Data Storage Area 20633$b$2 (FIG. 719) and displays the data on LCD 201 (FIG. 1) for a specified period of time (S3).

FIG. 730 illustrates Audio Next Software 20633$c$7 stored in Audio Playback Software Storage Area 20633$c$ (FIG. 718) which initiates the playback process of the next audio data stored in Audio Data Storage Area 20633$b$1 (FIG. 720).

Referring to FIG. 730, the audio next signal is input by utilizing Input Device 210 (FIG. 1) or via voice recognition system (S1). CPU 211 (FIG. 1) then initiates the playback process of the next audio data of the audio data selected in S3 of FIG. 723*a* both of which are stored in Audio Data Storage Area 20633*b*1 (FIG. 720) (S2), and retrieves Next Message Text Data 20633*b*2*g* from Message Data Storage Area 20633*b*2 (FIG. 719) and displays the data on LCD 201 (FIG. 1) for a specified period of time (S3).

FIG. 731 illustrates Audio Previous Software 20633*c*8 is a software program which initiates the playback process of the previous audio data stored in Audio Data Storage Area 20633*b*1 (FIG. 720). Referring to FIG. 731, the audio previous signal is input by utilizing Input Device 210 (FIG. 1) or via voice recognition system (S1). CPU 211 (FIG. 1) then initiates the playback process of the previous audio data of the audio data selected in S3 of FIG. 723*a* both of which are stored in Audio Data Storage Area 20633*b*1 (FIG. 720) (S2), and retrieves Previous Message Text Data 20633*b*2*h* from Message Data Storage Area 20633*b*2 (FIG. 719) and displays the data on LCD 201 (FIG. 1) for a specified period of time (S3).

As another embodiment, the audio data stored in Audio Data Storage Area 20633*b*1 (FIG. 720) may be stored in Host H (FIG. 429) and retrieved therefrom when the software programs described in FIGS. 724 through 731 are executed. In this embodiment, the audio data is temporarily stored in RAM 206 (FIG. 1) and is erased from the portion which is playbacked.

<<Audio Playback Function—Summary>>

(1) A communication device comprising a microphone, a speaker, a display, an input device and a multiple mode implementor, wherein said multiple mode implementor implements a voice communication mode and an audio playback mode, a series of sound data are input to and output from said microphone and said speaker respectively when said voice communication mode is implemented, an audio data is output from said speaker when said audio playback mode is implemented, and said audio data is refrained from being output from said speaker when an audio pause signal is input via said input device.

(2) The wireless communication device of Summary (1) wherein said audio data is resumed to playback from the point said audio data is paused when an audio resume signal is input via said input device.

(3) An audio playback software program installed in a communication device comprising a microphone, a speaker, a display, an input device and a multiple mode implementor, wherein said multiple mode implementor implements a voice communication mode and an audio playback mode, a series of sound data are input to and output from said microphone and said speaker respectively when said voice communication mode is implemented, an audio data is output from said speaker and a video data is output from said display under the control of said audio playback software program when said audio playback mode is implemented, and said audio data is refrained from being output from said speaker when an audio pause signal is input via said input device.

<<Ticket Purchasing Function>>

FIGS. 732 through 753 illustrate the ticket purchasing function which enables Communication Device 200 to purchase tickets in a wireless fashion. Here, the tickets capable to be purchased by utilizing the present function are, for example, the tickets for boarding airplanes and trains, and the tickets for entering movie theaters and museums. The present function is also applicable to purchasing coupons and any type of security which is in electronic format.

FIG. 732 illustrates the information stored in RAM 206 (FIG. 1) of Communication Device 200. As described in FIG. 732, RAM 206 includes Ticket Purchasing Information Storage Area 20634*a* of which the data and software programs stored therein are described in FIG. 733.

The data and software programs stored in Ticket Purchasing Information Storage Area 20634*a* (FIG. 732) are downloaded from Host H (FIG. 429) in the manner described in FIGS. 401 through 407.

FIG. 733 illustrates the storage areas included in Ticket Purchasing Information Storage Area 20634*a* (FIG. 732). As described in FIG. 733, Ticket Purchasing Information Storage Area 20634*a* includes Ticket Purchasing Data Storage Area 20634*b* and Ticket Purchasing Software Storage Area 20634*c*. Ticket Purchasing Data Storage Area 20634*b* stores the data necessary to implement the present function on the side of Communication Device 200, such as the ones described in FIGS. 734 and 735. Ticket Purchasing Software Storage Area 20634*c* stores the software programs necessary to implement the present function on the side of Communication Device 200, such as the ones described in FIG. 736.

FIG. 734 illustrates the storage areas included in Ticket Purchasing Data Storage Area 20634*b* (FIG. 733). As described in FIG. 734, Ticket Purchasing Data Storage Area 20634*b* includes Credit Card Data Storage Area 20634*b*1, Purchased Ticket Data Storage Area 20634*b*2, Device List Data Storage Area 20634*b*3, and Ticket List Data Storage Area 20634*b*4. Credit Card Data Storage Area 20634*b*1 stores the credit card data of the user of Communication Device 200 of which the data stored therein are further described in FIG. 735. Purchased Ticket Data Storage Area 20634*b*2 stores the data regarding the ticket purchased by utilizing the present function. Device List Data Storage Area 20634*b*3 stores the data regarding the devices to which the data stored in Purchased Ticket Data Storage Area 20634*b*2 can be sent. Ticket List Data Storage Area 20634*b*4 stores the ticket list data sent by Host H (FIG. 429) which is displayed on LCD 201 (FIG. 1).

FIG. 735 illustrates the data stored in Credit Card Data Storage Area 20634*b*1 (FIG. 734). As described in FIG. 735, Credit Card Data Storage Area 20634*b*1 stores the credit card data of the user of Communication Device 200, i.e., the name of the user, the credit card number, the expiration date, the billing address, and the phone number.

FIG. 736 illustrates the software programs stored in Ticket Purchasing Software Storage Area 20634*c* (FIG. 733). As described in FIG. 736, Ticket Purchasing Software Storage Area 20634*c* stores Credit Card Data Input Software 20634*c*1, Ticket Data Displaying Software 20634*c*2, Ticket Data Selecting Software 20634*c*3, Purchase Data Sending Software 20634*c*4, Purchased Ticket Data Processing Software 20634*c*5, and Purchased Ticket Data Transferring Software 20634*c*6. Credit Card Data Input Software 20634*c*1 is a software program described in FIG. 745. Ticket Data Displaying Software 20634*c*2 is a software program described in FIG. 743. Ticket Data Selecting Software 20634*c*3 is a software program described in FIG. 744. Purchase Data Sending Software 20634*c*4 is a software program described in FIG. 746. Purchased Ticket Data Processing Software 20634*c*5 is a software program described in FIG. 752. Purchased Ticket Data Transferring Software 20634*c*6 is a software program described in FIG. 753.

FIG. 737 illustrates the information stored in Host Information Storage Area H00*a* (FIG. 429) of Host H. As described in FIG. 737, Host Information Storage Area H00*a* includes Ticket Purchasing Information Storage Area H34_a_ of which the data and software programs stored therein are described in FIG. 738.

FIG. 738 illustrates the data and software programs stored in Ticket Purchasing Information Storage Area H34_a_ (FIG. 738). As described in FIG. 738, Ticket Purchasing Information Storage Area H34_a_ includes Ticket Purchasing Data Storage Area H34_b_ and Ticket Purchasing Software Storage Area H34_c_. Ticket Purchasing Data Storage Area H34_b_ stores the data necessary to implement the present function on the side of Host H (FIG. 429), such as the ones described in FIGS. 739 through 741. Ticket Purchasing Software Storage Area H34_c_ stores the software programs necessary to implement the present function on the side of Host H, such as the ones described in FIG. 742.

FIG. 739 illustrates the data stored in Ticket Purchasing Data Storage Area H34_b_ (FIG. 738). As described in FIG. 739, Ticket Purchasing Data Storage Area H34_b_ includes Credit Card Data Storage Area H34_b_1, Ticket Data Storage Area H34_b_2, and Purchase Data Storage Area H34_b_3. Credit Card Data Storage Area H34_b_1 stores each user's credit card data as described in FIG. 740. Ticket Data Storage Area H34_b_2 stores the data regarding the tickets which can be purchased by utilizing the present function of which the data stored therein are described in FIG. 741. Purchase Data Storage Area H34_b_3 stores the purchase data sent from Communication Device 200 as described in FIG. 746.

FIG. 740 illustrates the data stored in Credit Card Data Storage Area H34_b_1 (FIG. 739). As described in FIG. 740, Credit Card Data Storage Area H34_b_1 comprises four columns, i.e., User ID, Credit Card Data, Purchase Confirmation Number, and Ticket ID. The column User ID stores the identification of each user of Communication Device 200. The column Credit Card Data stores the credit card data of the user of the corresponding User ID. Each credit card data stored in this column has the same data structure as the one described in FIG. 735. The column Purchase Confirmation Number stores the purchase confirmation number produced in the manner described in FIG. 750. The column Ticket ID stores the identification of the ticket(s) purchased by utilizing the present function. In the example described in FIG. 740, Credit Card Data Storage Area H34_b_1 stores the 'User ID' H34UID1 of which the corresponding 'Credit Card Data', 'Purchase Confirmation Number', and 'Ticket ID' is H34CCD1, H34TPCN1, and H34TID1, respectively; the 'User ID' H34UID2 of which the corresponding 'Credit Card Data' is H34CCD2; the 'User ID' H34UID3 of which the corresponding 'Credit Card Data' is H34CCD3; and the 'User ID' H34UID4 of which the corresponding 'Credit Card Data' is H34CCD4.

FIG. 741 illustrates the data stored in Ticket Data Storage Area H34_b_2 (FIG. 739). As described in FIG. 741, Ticket Data Storage Area H34_b_2 comprises four columns, i.e., 'Ticket ID', 'Ticket Title', 'Ticket Description', and 'Price Data'. 'Ticket ID' is the identification of each ticket capable to be purchased by utilizing the present function. 'Ticket Title' is the title of the ticket of the corresponding 'Ticket ID'. 'Ticket Description' is the description of the ticket of the corresponding 'Ticket ID'. 'Price Data' is the data regarding the price of the ticket of the corresponding 'Ticket ID'. In the example described in FIG. 741, Ticket Data Storage Area H34_b_2 stores 'Ticket ID' H34TID1 of which 'Ticket Title', 'Ticket Description', and 'Price Data' is H34TT1, H34TD1, and H34PD1, respectively; 'Ticket ID' H34TID2 of which 'Ticket Title', 'Ticket Description', and 'Price Data' is H34TT2, H34TD2, and H34PD2, respectively; 'Ticket ID' H34TID3 of which 'Ticket Title', 'Ticket Description', and 'Price Data' is H34TT3, H34TD3, and H34PD3, respectively; and 'Ticket ID' H34TID4 of which 'Ticket Title', 'Ticket Description', and 'Price Data' is H34TT4, H34TD4, and H34PD4, respectively.

FIG. 742 illustrates the software programs stored in Ticket Purchasing Software Storage Area H34_c_ (FIG. 738). As described in FIG. 742, Ticket Purchasing Software Storage Area H34_c_ stores Credit Card Authentication Software H34_c_1, Ticket Data Displaying Software H34_c_2, and Purchase Data Processing Software H34_c_3. Credit Card Authentication Software H34_c_1 is a software program described in FIG. 749. Ticket Data Displaying Software H34_c_2 is a software program described in FIG. 743. Purchase Data Processing Software H34_c_3 is a software program described in FIG. 750.

FIG. 743 illustrates both Ticket Data Displaying Software 20634_c_2 stored in Ticket Purchasing Software Storage Area 20634_c_ (FIG. 736) of Communication Device 200 and Ticket Data Displaying Software H34_c_2 stored in Ticket Purchasing Software Storage Area H34_c_ (FIG. 742) of Host H (FIG. 429). Referring to FIG. 743, CPU 211 (FIG. 1) of Communication Device 200 sends a request for a ticket list data to Host H (S1). In response to the request, Host H retrieves the data stored in the columns Ticket Title and Ticket Description from Ticket Data Storage Area H34_b_2 (FIG. 741) (S2). In the example described in FIG. 741, 'Ticket Title' H34TT1 and its 'Ticket Description' H34TD1, 'Ticket Title' H34TT2 and its 'Ticket Description' H34TD2, 'Ticket Title' H34TT3 and its 'Ticket Description' H34TD3, and 'Ticket Title' H34TT4 and its 'Ticket Description' H34TD4 are retrieved from Ticket Data Storage Area H34_b_2 and sent as the ticket list data to Communication Device 200. CPU 211, upon receiving the ticket list data from Host H, stores the data in Ticket List Data Storage Area 20634_b_4 (FIG. 734) and displays them on LCD 201 (FIG. 1) (S3).

FIG. 744 illustrates Ticket Data Selecting Software 20634_c_3 stored in Ticket Purchasing Software Storage Area 20634_c_ (FIG. 736) of Communication Device 200. Referring to FIG. 744, a particular ticket data is selected from the ticket list data displayed on LCD (FIG. 1) by utilizing Input Device 210 (FIG. 1) or via voice recognition system (S1). CPU 211 (FIG. 1) stores the ticket data selected in S1 in a specific storage area in Ticket Purchasing Data Storage Area 20634_b_ (FIG. 734) (S2).

FIG. 745 illustrates Credit Card Data Input Software 20634_c_1 stored in Ticket Purchasing Software Storage Area 20634_c_ (FIG. 736) of Communication Device 200. Referring to 745, CPU 211 (FIG. 1) displays the credit card data input screen on LCD 201 (FIG. 1) to input data regarding the credit card of the user of Communication Device 200 (S1). The credit card data described in FIG. 735 (i.e., Name, Credit Card Number, Expiration Date, Billing Address, and Phone Number) are input by utilizing Input Device 210 (FIG. 1) or via voice recognition system (S2), and CPU 211 stores the credit card data to Credit Card Data Storage Area 20634_b_1 (FIG. 734) (S3). The data stored in Credit Card Data Storage Area 20634_b_1 is stored permanently unless they are erased by the user of Communication Device 200 to utilize the data for the next purchase of tickets utilizing the present function.

FIG. 746 illustrates Purchase Data Sending Software 20634_c_4 stored in Ticket Purchasing Software Storage Area 20634_c_ (FIG. 736) of Communication Device 200. Referring to 746, CPU 211 (FIG. 1) retrieves the selected ticket data (i.e., the ticket data selected in S1 of FIG. 744) (S1). CPU 211 then retrieves the credit card data from Credit Card Data Storage Area 20634$b$1 (FIG. 734) (S2). CPU 211 produces Purchase Data 20634PD, which is described in FIG. 747, and sends the data to Host H (S3).

FIG. 747 illustrates the data included in Purchase Data 20634PD produced in S3 of FIG. 746. As described in FIG. 747, Purchase Data 20634PD includes Selected Ticket Data 20634PD1 and Credit Card Data 20634PD2. Selected Ticket Data 20634PD1 is the data retrieved in S1 of FIG. 746, and Credit Card Data 20634PD2 is the data retrieved in S2 of FIG. 746.

FIG. 748 illustrates the software program stored in Ticket Purchasing Software Storage Area H34$c$ (FIG. 742) of Host H (FIG. 429). Referring to FIG. 748, Host H receives Purchase Data 20634PD (FIG. 747) (S1) and stores the data in Purchase Data Storage Area H34$b$3 (FIG. 739) (S2).

FIG. 749 illustrates Credit Card Authentication Software H34$c$1 stored in Ticket Purchasing Software Storage Area H34$c$ (FIG. 742) of Host H (FIG. 429). Referring to FIG. 749, Host H retrieves Credit Card Data 20634PD2 from Purchase Data Storage Area H34$b$3 (FIG. 739) (S1). Host H then compares Credit Card Data 20634PD2 with the credit card data stored in Credit Card Data Storage Area H34$b$1 (FIG. 740) (S2). If Credit Card Data 20634PD2 matches with one of the credit card data stored in Credit Card Data Storage Area H34$b$1 (S3), Host H initiates the purchase process described in FIG. 750 (S4).

FIG. 750 illustrates Purchase Data Processing Software H34$c$3 stored in Ticket Purchasing Software Storage Area H34$c$ (FIG. 742) of Host H (FIG. 429). Referring to FIG. 750, Host H retrieves Selected Ticket Data 20634PD1 from Purchase Data Storage Area H34$b$3 (FIG. 739) (S1), and initiates the purchase process by utilizing the data, such as retrieving the price data from Ticket Data Storage Area H34$b$2 (FIG. 741) and sending the bill to a credit card company (S2). Host H produces a purchase confirmation number (S3), and stores the data in Credit Card Data Storage Area H34$b$1 (FIG. 740) as well as the ticket ID of Selected Ticket Data 20634PD1 (S4). Host H retrieves the ticket ID of Selected Ticket Data 20634PD1 and the purchase confirmation number from Credit Card Data Storage Area H34$b$1 (S5), and produces Purchased Ticket Data H34PTD, which is sent to Communication Device 200 (S6). Assume that the user whose User ID is H34UID1 purchases a ticket of which Ticket Title is H34TT1 described in FIG. 740. After the purchase process described in S2 is completed, Host H produces a purchase confirmation number (i.e., H34TPCN1) (S3). Host H then stores the purchase confirmation number (i.e., H34TPCN1) in column Purchase Confirmation Number of Credit Card Data Storage Area H34$b$1 (FIG. 740), and further retrieves the corresponding Ticket ID (H34TID1) from Ticket Data Storage Area H34$b$2 (FIG. 741) which is stored in column Ticket ID of Credit Card Data Storage Area H34$b$1 (S4). Ticket ID H34TT1 and purchase confirmation number H34TPCN1 is retrieved from Credit Card Data Storage Area H34$b$1 (S5), and Purchased Ticket Data H34PTD is produced and sent to Communication Device 200 thereafter (S6).

FIG. 751 illustrates the data included in Purchased Ticket Data H34PTD described in S6 of FIG. 750. As described in FIG. 751, Purchased Ticket Data H34PTD includes Ticket ID H34PTD1 and Purchase Confirmation Number H34PTD2. Ticket ID H34PTD1 and Purchase Confirmation Number H34PTD2 are the data stored in Credit Card Data Storage Area H34$b$1 (FIG. 740) in S4 of FIG. 750. In the example described in FIG. 740, Ticket ID H34TID1 constitutes Ticket ID H34PTD1 and Purchase Confirmation Number H34TPCN1 constitutes Purchase Confirmation Number H34PTD2.

FIG. 752 illustrates Purchased Ticket Data Processing Software 20634$c$5 stored in Ticket Purchasing Software Storage Area 20634$c$ (FIG. 736) of Communication Device 200. Referring to FIG. 752, CPU 211 (FIG. 1) receives Purchased Ticket Data H34PTD (FIG. 751) from Host H (FIG. 429) (S1). CPU 211 then stores Purchased Ticket Data H34PTD to Purchased Ticket Data Storage Area 20634$b$2 (FIG. 734) (S2), and retrieves Ticket ID H34PTD1 and Purchase Confirmation Number H34PTD2 therefrom (S3), which are displayed on LCD 201 (FIG. 1) (S4).

FIG. 753 illustrates Purchased Ticket Data Transferring Software 20634$c$6 stored in Ticket Purchasing Software Storage Area 20634$c$ (FIG. 736) of Communication Device 200 to send the purchased ticket data to another device. Referring to FIG. 753, CPU 211 (FIG. 1) retrieves a list of devices capable to receive the purchased ticket data from Device List Data Storage Area 20634$b$3 (FIG. 734) (S1), which is displayed on LCD 201 (FIG. 1) (S2). A particular device is selected by utilizing Input Device 210 (FIG. 1) or via voice recognition system (S3). CPU 211 then retrieves Purchased Ticket Data H34PTD from Purchased Ticket Data Storage Area 20634$b$2 (FIG. 734) (S4), and sends the data to the device selected in S3. As another embodiment, Purchased Ticket Data H34PTD may be sent by e-mails.

For the avoidance of doubt, Purchased Ticket Data H34PTD (FIG. 751) does not necessarily include both Ticket ID H34PTD1 and Purchase Confirmation Number H34PTD2, i.e., the data may include only either Ticket ID H34PTD1 or Purchase Confirmation Number H34PTD2.

<<Ticket Purchasing Function—Summary>>

(1) A ticket purchasing system comprising a communication device and a host computer, said wireless communication device comprises a microphone, a speaker, a display, an input device and a multiple mode implementor, wherein said multiple mode implementor implements a voice communication mode and a ticket purchasing mode, a series of audio data are input to and output from said microphone and said speaker respectively when said voice communication mode is implemented, a list of ticket data is displayed on said display, a ticket data is selected by said input device, the selected ticket data is sent to said host computer, and said host computer sends a purchased ticked information to said communication device when said ticket purchasing mode is implemented.

(2) A communication device comprising a microphone, a speaker, a display, an input device and a multiple mode implementor, wherein said multiple mode implementor implements a voice communication mode and a ticket purchasing mode, a series of audio data are input to and output from said microphone and said speaker respectively when said voice communication mode is implemented, a list of ticket data is displayed on said display, a ticket data is selected by said input device, the selected ticket data is sent to a host computer, and said communication device receives a purchased ticket information from said host when said ticket purchasing mode is implemented.

(3) A ticket purchasing software program installed in a communication device comprising a microphone, a speaker, a display, an input device and a multiple mode implementor, wherein said multiple mode implementor implements a voice communication mode and a ticket purchasing mode, a series of audio data are input to and output from said microphone and said speaker respectively when said voice communication mode is implemented, a list of ticket data is displayed on said display under the control of said ticket purchasing software program, a ticket data is selected by said input device under the control of said ticket purchasing software program, the selected ticket data is sent to a host computer under the control of said ticket purchasing software program, and said communication device receives a purchased ticket information from said host under the control of said ticket purchasing software program when said ticket purchasing mode is implemented.

<<Remote Data Erasing Function>>

FIGS. 754 through 774 illustrate the remote data erasing function which enables Host H (FIG. 429) to erase a portion or all data stored in RAM 206 (FIG. 1) of Communication Device 200.

FIG. 754 illustrates the information stored in RAM 206 (FIG. 1) of Communication Device 200. As described in the present drawing, RAM 206 includes Remote Data Erasing Information Storage Area 20635*a* of which the data and software programs stored therein are described in FIG. 755.

The data and software programs stored in Remote Data Erasing Information Storage Area 20635*a* (FIG. 754) are downloaded from Host H (FIG. 429) in the manner described in FIGS. 401 through 407.

FIG. 755 illustrates the storage areas included in Remote Data Erasing Information Storage Area 20635*a* (FIG. 754). As described in the present drawing, Remote Data Erasing Information Storage Area 20635*a* includes Remote Data Erasing Data Storage Area 20635*b* and Remote Data Erasing Software Storage Area 20635*c*. Remote Data Erasing Data Storage Area 20635*b* stores the data necessary to implement the present function on the side of Communication Device 200, such as the ones described in FIG. 756. Remote Data Erasing Software Storage Area 20635*c* stores the software programs necessary to implement the present function on the side of Communication Device 200, such as the ones described in FIGS. 763, 764, 769, 770, 772, and 773.

FIG. 756 illustrates the storage areas included in Remote Data Erasing Data Storage Area 20635*b* (FIG. 755). As described in the present drawing, Remote Data Erasing Data Storage Area 20635*b* includes Storage Area Data Storage Area 20635*b*1 and To-Be-Erased Storage Area Data Storage Area 20635*b*2. Storage Area Data Storage Area 20635*b*1 stores the storage area data which represents the structure of the storage areas (i.e., the directory) including the identifications of the data (including software programs and other types of information) stored in each storage area (i.e., each directory) of RAM 206 (FIG. 1). To-Be-Erased Storage Area Data Storage Area 20635*b*2 stores the to-be-erased storage area data which represents the storage areas (i.e., the directories) to be erased by utilizing the present function.

FIG. 757 illustrates the storage areas included in Remote Data Erasing Software Storage Area 20635*c* (FIG. 755). As described in the present drawing, Remote Data Erasing Software Storage Area 20635*c* (FIG. 755) includes Storage Area Selecting Software 20635*c*1, To-Be-Erased Storage Area Data Sending Software 20635*c*2, and Storage Area Erasing Software 20635*c*3. Storage Area Selecting Software 20635*c*1 is a software program described in FIG. 763. To-Be-Erased Storage Area Data Sending Software 20635*c*2 is a software program described in FIG. 764. Storage Area Erasing Software 20635*c*3 is a software program described in FIG. 769.

FIG. 758 illustrates the storage area included in Host Information Storage Area H00*a* of Host H (FIG. 429). As described in the present drawing, Host Information Storage Area H00*a* includes Remote Data Erasing Information Storage Area H35*a* of which the data and software program stored therein are described in FIG. 759.

FIG. 759 illustrates the storage areas included in Remote Data Erasing Information Storage Area H35*a* (FIG. 758). As described in the present drawing, Remote Data Erasing Information Storage Area H35*a* includes Remote Data Erasing Data Storage Area H35*b* and Remote Software Erasing Software Storage Area H35*c*. Remote Data Erasing Data Storage Area H35*b* stores the data necessary to implement the present function on the side of Host H (FIG. 429), such as the ones described in FIGS. 760 and 761. Remote Software Erasing Software Storage Area H35*c* stores the software programs necessary to implement the present function on the side of Host H, such as the ones described in FIG. 762.

FIG. 760 illustrates the storage area included in Remote Data Erasing Data Storage Area H35*b* (FIG. 759). As described in the present drawing, Remote Data Erasing Data Storage Area H35*b* includes To-Be-Erased Storage Area Data Storage Area H35*b*1 of which the data stored therein are described in FIG. 761.

FIG. 761 illustrates the data stored in To-Be-Erased Storage Area Data Storage Area H35*b*1 (FIG. 760). As described in the present drawing, To-Be-Erased Storage Area Data Storage Area H35*b*1 is comprised of two columns, i.e., 'User ID' and 'To-Be-Erased Storage Area Data'. Column 'User ID' stores the identifications of the users of Communication Device 200. Column 'To-Be-Erased Storage Area Data' stores the to-be-erased storage area data of Communication Device 200 of the corresponding 'User ID'. Here, the to-be-erased storage area data represents the storage areas (i.e., the directories) of Communication Device 200 to be erased by utilizing the present function. The default data stored in To-Be-Erased Storage Area Data Storage Area H35*b*1 is 'Null'. In the example described in the present drawing, the 'User ID' H35*b*1*a* of which the 'To-Be-Erased Storage Area Data' is 20635TBE1; the 'User ID' H35*b*1*b* of which the 'To-Be-Erased Storage Area Data' is 'Null'; and the 'User ID' H35*b*1*c* of which the 'To-Be-Erased Storage Area Data' is 'Null' are stored in To-Be-Erased Storage Area Data Storage Area H35*b*1.

FIG. 762 illustrates the software programs stored in Remote Data Erasing Software Storage Area H35*c* (FIG. 755). As described in the present drawing, Remote Data Erasing Software Storage Area H35*c* stores To-Be-Erased Storage Area Data Receiving Software H35*c*1, Selected Storage Area Erasing Software H35*c*2, and Storage Area Selecting Software H35*c*3. To-Be-Erased Storage Area Data Receiving Software H35*c*1 is described in FIG. 766. Selected Storage Area Erasing Software H35*c*2 is described in FIG. 767. Storage Area Selecting Software H35*c*3 is described in FIG. 774.

FIG. 763 illustrates Storage Area Selecting Software 20635*c*1 stored in Remote Data Erasing Software Storage Area 20635*c* (FIG. 757) of Communication Device 200 which selects the storage areas to be erased by utilizing the present function. Referring to the present drawing, CPU 211 (FIG. 1) retrieves the storage area data which represents the structure of the storage areas (i.e., the directory) including the identifications of the data (including software programs and other types of information) stored in each storage area (i.e., each directory) of RAM 206 (FIG. 1) from Storage Area Data Storage Area 20635*b*1 (FIG. 756) (S1), and displays a list of the storage areas on LCD 201 (FIG. 1) (S2). A particular storage area to be erased by utilizing the present function is selected by utilizing Input Device 210 (FIG. 1) or via voice recognition system (S3). CPU 211 then stores the identifications of the storage areas selected in S2 as the to-be-erased storage area data to To-Be-Erased Storage Area Data Storage Area 20635*b*2 (FIG. 756) (S4).

FIG. 764 illustrates To-Be-Erased Storage Area Data Sending Software 20635*c*2 stored in Remote Data Erasing Software Storage Area 20635*c* (FIG. 757) which sends the to-be-erased storage area data to Host H (FIG. 429). Referring to the present drawing, CPU 211 (FIG. 1) retrieves the to-be-erased storage area data from To-Be-Erased Storage Area Data Storage Area 20635*b*2 (FIG. 756) (S1) and sends To-Be-Erased Storage Area Data 20635TBE to Host H of which the data included therein are described in FIG. 765 (S2).

FIG. 765 illustrates the data included in To-Be-Erased Storage Area Data 20635TBE described in S2 of FIG. 764. As described in the present drawing, To-Be-Erased Storage Area Data 20635TBE includes To-Be-Erased Storage Area Data 20635TBE1 and User ID 20635TBE2. To-Be-Erased Storage Area Data 20635TBE1 is the data retrieved in S1 of FIG. 764. User ID 20635TBE2 is the identification of the user of Communication Device 200.

FIG. 766 illustrates To-Be-Erased Storage Area Data Receiving Software H35*c*1 stored in Remote Data Erasing Software Storage Area H35*c* (FIG. 762) of Host H (FIG. 429) which receives the to-be-erased storage area data sent from Communication Device 200. Referring to the present drawing, Host H receives To-Be-Erased Storage Area Data 20635TBE sent from Communication Device 200 (S1). Host H then retrieves To-Be-Erased Storage Area Data 20635TBE1 and User ID 20635TBE2 therefrom (S2), and stores To-Be-Erased Storage Area Data 20635TBE1 in To-Be-Erased Storage Area Data Storage Area H35*b*1 (FIG. 761) (S3). In the example described in FIG. 761, To-Be-Erased Storage Area Data 20635TBE1 is stored in column 'To-Be-Erased Storage Area Data' corresponding to the 'User ID' H35*b*1*a*.

FIG. 767 illustrates Selected Storage Area Erasing Software H35*c*2 stored in Remote Data Erasing Software Storage Area H35*c* (FIG. 762) of Host H (FIG. 429) which erases the selected storage areas of Communication Device 200. Referring to the present drawing, the input storage area erasing signal which indicates to initiate the process to erase the storage areas of Communication Device 200 is input to Host H (S1). Next, the user ID is input to Host H to identify the identification of Communication Device 200 (the user ID in the present example is 'H35*b*1*a*' as described in FIG. 761) (S2). Host H retrieves To-Be-Erased Storage Area Data 20635TBE1 from To-Be-Erased Storage Area Data Storage Area H35*b*1 (FIG. 761) (S3) and sends to Communication Device 200 Storage Area Erasing Command H35SAEC which is described in FIG. 768 (S4).

FIG. 768 illustrates the data included in Storage Area Erasing Command H35SAEC (FIG. 767). As described in the present drawing, Storage Area Erasing Command H35SAEC includes Storage Area Erasing Instruction H35SAEC1 and To-Be-Erased Storage Area Data H35SAEC2/User ID H35SAEC3. Storage Area Erasing Instruction H35SAEC1 is an instruction to erase the storage areas indicated in To-Be-Erased Storage Area Data H35SAEC2. To-Be-Erased Storage Area Data H35SAEC2 is the data indicating the storages areas erased by utilizing the present function. User ID H35SAEC3 is the identification of the user of Communication Device 200 to identify the device to which the present function is implemented.

FIG. 769 illustrates Storage Area Erasing Software 20635*c*3 stored in Remote Data Erasing Software Storage Area 20635*c* (FIG. 757) of Communication Device 200 which erases the selected storage areas of RAM 206 (FIG. 1). Referring to the present drawing, CPU 211 (FIG. 1) of Communication Device 200 receives Storage Area Erasing Command H35SAEC from Host H (FIG. 429) (S1), and retrieves Storage Area Erasing Instruction H35SAEC1 (FIG. 768) therefrom (S2). In response to Storage Area Erasing Instruction H35SAEC1, CPU 211 retrieves To-Be-Erased Storage Area Data H35SAEC2 (S3), and erases the storage areas of RAM 206 in accordance with To-Be-Erased Storage Area Data H35SAEC2 (S4).

<<Remote Data Erasing Function—Other Embodiments>>

FIG. 770 illustrates another embodiment of Storage Area Erasing Software 20635*c*3 stored in Remote Data Erasing Software Storage Area 20635*c* (FIG. 757) of Communication Device 200 when the user of Communication Device 200 has not selected the storage areas to be erased. Assuming that the user has not gone through the process described in FIG. 763. The data, in this case, stored in column 'To-Be-Erased Storage Area Data' of To-Be-Erased Storage Area Data Storage Area H35*b*1 is 'Null' as described in FIG. 761. Referring to the present drawing, CPU 211 (FIG. 1) of Communication Device 200 receives Storage Area Erasing Command H35SAEC from Host H (FIG. 429) (S1), and retrieves Storage Area Erasing Instruction H35SAEC1 (FIG. 768) therefrom (S2). In response to Storage Area Erasing Instruction H35SAEC1, CPU 211 retrieves To-Be-Erased Storage Area Data H35SAEC2 (S3). If the data included in To-Be-Erased Storage Area Data H35SAEC2 is 'Null' (S4), CPU 211 erases all storage areas as well as the data, software programs, and all types of information stored therein included in RAM 206 (FIG. 1) (S5).

FIGS. 771 and 772 illustrates another embodiment of the described in FIGS. 768 and 769.

FIG. 771 illustrates another embodiment of Storage Area Erasing Command H35SAEC described in FIG. 768. As described in the present drawing, Storage Area Erasing Command H35SAEC includes Storage Area Erasing Instruction H35SAEC1 and User ID H35SAEC3 while To-Be-Erased Storage Area Data H35SAEC2 is excluded in this embodiment compared to the data illustrated in FIG. 768.

FIG. 772 illustrates another embodiment of Storage Area Erasing Software 20635*c*3 described in FIG. 769 stored in Remote Data Erasing Software Storage Area 20635*c* (FIG. 757) of Communication Device 200 which erases the storage areas of RAM 206 (FIG. 1). Referring to the present drawing, CPU 211 (FIG. 1) of Communication Device 200 receives Storage Area Erasing Command H35SAEC from Host H (FIG. 429) (S1), and retrieves Storage Area Erasing Instruction H35SAEC1 (FIG. 771) therefrom (S2). In response to Storage Area Erasing Instruction H35SAEC1, CPU 211 retrieves the to-be-erased storage area data from To-Be-Erased Storage Area Data Storage Area 20635*b*2 (FIG. 756) of Communication Device 200 (S3), and erases the storage areas of RAM 206 in accordance with the data retrieved in S3 (S4).

FIG. 773 illustrates another embodiment of Storage Area Erasing Software 20635*c*3 described in FIG. 772 stored in Remote Data Erasing Software Storage Area 20635*c* (FIG. 757) of Communication Device 200 which erases the storage areas of RAM 206 (FIG. 1). Referring to the present drawing, CPU 211 (FIG. 1) of Communication Device 200 receives Storage Area Erasing Command H35SAEC from Host H (FIG. 429) (S1), and retrieves Storage Area Erasing Instruction H35SAEC1 (FIG. 771) therefrom (S2). In response to Storage Area Erasing Instruction H35SAEC1, CPU 211 retrieves the to-be-erased storage area data from To-Be-Erased Storage Area Data Storage Area 20635*b*2 (FIG. 756) of Communication Device 200 (S3). If the data included in the to-be-erased storage area data is 'Null' (S4), CPU 211 erases all storage areas as well as the data, software programs, and all types of information stored therein included in RAM 206 (FIG. 1) (S5).

FIG. 774 illustrates Storage Area Selecting Software H35*c*3 (FIG. 762) of Host H (FIG. 429) which remotely erases the storage areas of RAM 206 (FIG. 1). Referring to the present drawing, Host H accesses RAM 206 of Communication Device 200 and retrieves the storage area data from Storage Area Data Storage Area **20635*b*1 (FIG. 756) (S1). A list of the storage areas of RAM 206 (FIG. 1) is displayed on the monitor of Host H (S2). The operator of Host H selects the storage areas to be erased (S3). The data selected in S3 is stored as the to-be-erased storage area data in To-Be-Erased Storage Area Data Storage Area H35*b*1 (S4). The description of FIG. 767** follows thereafter.

<<Remote Data Erasing Function—Summary>>

(1) A remote data erasing system comprising a communication device and a host computer, said wireless communication device comprises a microphone, a speaker, a display, an input device, a storage means, and a multiple mode implementor, wherein said multiple mode implementor implements a voice communication mode and a remote data erasing mode, a series of audio data are input to and output from said microphone and said speaker respectively when said voice communication mode is implemented, said host computer sends an erasing command to said wireless communication device, said wireless communication device erases the data stored in said storage means upon receiving said erasing command.

(2) A communication device comprising a microphone, a speaker, a display, an input device, a storage means and a multiple mode implementor, wherein said multiple mode implementor implements a voice communication mode and a ticket purchasing mode, a series of audio data are input to and output from said microphone and said speaker respectively when said voice communication mode is implemented, said wireless communication device erases the data stored in said storage means upon receiving an erasing command.

(3) A remote data erasing software program installed in a communication device comprising a microphone, a speaker, a display, an input device, a storage means and a multiple mode implementor, wherein said multiple mode implementor implements a voice communication mode and a ticket purchasing mode, a series of audio data are input to and output from said microphone and said speaker respectively when said voice communication mode is implemented, said wireless communication device erases the data stored in said storage means under the control of said remote data erasing software upon receiving an erasing command.

<<Business Card Function>>

FIGS. 775 through 783 illustrate the business card function which enables Communication Device 200 ('Device A') to send the business card data to another Communication Device 200 ('Device B').

FIG. 775 illustrates the connection between Device A and Device B. As described in the present drawing, Device A and Device B are directly connected in a wireless fashion. Both devices may send and receive wireless signals via Antenna 218 (FIG. 1) or LED 219 (FIG. 1).

FIG. 776 illustrates the information stored in RAM 206 (FIG. 1) of both Device A and Device B. As described in the present drawing, RAM 206 (FIG. 1) includes Business Card Information Storage Area **20636*a* of which the data and the software programs stored therein are described in FIG. 777**.

The data and software programs stored in Business Card Information Storage Area **20636*a*(FIG. 776) are downloaded from Host H (FIG. 429) in the manner described in FIGS. 401 through 407**.

FIG. 777 illustrates the storage areas included in Business Card Information Storage Area **20636*a* (FIG. 776). As described in the present drawing, Business Card Data Storage Area 20636*b* includes Business Card Data Storage Area 20636*b* and Business Card Software Storage Area 20636*c*. Business Card Data Storage Area 20636*b* stores the data necessary to implement the present function, such as the ones described in FIGS. 778 through 780. Business Card Software Storage Area 20636*c* stores the software programs necessary to implement the present function, such as the ones described in FIG. 781**.

FIG. 778 illustrates the storage areas included in Business Card Data Storage Area **20636*b* (FIG. 777). As described in the present drawing, Business Card Data Storage Area 20636*b* includes User's Business Card Data Storage Area 20636*b*1 and Other Users' Business Card Data Storage Area 20636*b*2. User's Business Card Data Storage Area 20636*b*1 stores data as described in FIG. 779. Other Users' Business Card Data Storage Area 20636*b*2 stores data as described in FIG. 780**.

FIG. 779 illustrates the data included in User's Business Card Data Storage Area **20636*b*1 (FIG. 778). As described in the present drawing, User's Business Card Data Storage Area 20636*b*1 includes 'Name', 'Title', 'Department', 'Phone Number', 'Fax Number', 'Email Address', and 'Office Address'. 'Name' is the name of the user of Communication Device 200. 'Title' is the title of the user of Communication Device 200 at work. 'Department' is the department or the devision for which the user of Communication Device 200 works. 'Phone Number' is the phone number of the user of Communication Device 200 at work. 'Fax Number' is the fax number of the user of Communication Device 200 at work. 'Email Address' is the email address of the user of Communication Device 200 at work. 'Office Address' is the street address of the office where the user of Communication Device 200 works. User's Business Card Data Storage Area 20636*b*1 of Device A stores 'Name', 'Title', 'Department', 'Phone Number', 'Fax Number', 'Email Address', and 'Office Address' of the user of Device A. User's Business Card Data Storage Area 20636*b*1** of Device B stores 'Name', 'Title', 'Department', 'Phone Number', 'Fax Number', 'Email Address', and 'Office Address' of the user of Device B.

FIG. 780 illustrates the data stored in Other Users' Business Card Data Storage Area **20636*b*2(FIG. 778). As described in the present drawing, Other Users' Business Card Data Storage Area 20636*b*2 comprises two columns, i.e., 'User ID' and 'Business Card Data'. 'User ID' is the identification of the user of Communication Device 200 which is utilized for identifying Communication Device 200. 'Business Card Data' is the data of which the data structure is as same as the one described in FIG. 779. In the example described in the present drawing, Other Users' Business Card Data Storage Area 20636*b*2 comprises 'User ID' 20636UI1 of which 'Business Card Data' is 20636CD1, 'User ID' 20636UI2 of which 'Business Card Data' is 20636CD2, 'User ID' 20636UI3 of which 'Business Card Data' is 20636CD3, and 'User ID' 20636UI4 of which 'Business Card Data' is 20636CD4. Each of 'Business Card Data' 20636CD1, 20636CD2, 20636CD3, and 20636CD4 includes 'Name', 'Title', 'Department', 'Phone Number', 'Fax Number', 'Email Address', and 'Office Address'. 'Name' is the name of the user of Communication Device 200 in the manner described in FIG. 779. The data stored in Other Users' Business Card Data Storage Area 20636*b*2 of both Device A and Device B are not necessarily identical to each other. For example, Device A may store the data described in the present drawing, and Device B may store the following data: 'User ID' 20636UI5 of which 'Business Card Data' is 20636CD5, 'User ID' 20636UI6 of which 'Business Card Data' is 20636CD6, 'User ID' 20636UI7 of which 'Business Card Data' is 20636CD7, and 'User ID' 20636UI8 of which 'Business Card Data' is 20636CD8**.

FIG. 781 illustrates the software programs stored in Business Card Software Storage Area 20636*c* (FIG. 777). As described in the present drawing, Business Card Software Storage Area 20636*c* stores User Card Data Sending Software 20636*c*1 and Other User Card Data Receiving Software 20636*c*2. User Card Data Sending Software 20636*c*1 is a software program described in FIG. 782. Other User Card Data Receiving Software 20636*c*2 is a software program described in FIG. 783.

FIG. 782 illustrates User Card Data Sending Software 20636*c*1 (FIG. 781) of Communication Device 200 (Device A in the present example). Referring to the present drawing, CPU 211 (FIG. 1) of Device A retrieves the user card data from User's Business Card Data Storage Area 20636*b*1 (FIG. 778) (S1). CPU 211 then connects to Device B in the manner described in FIG. 775, and sends Transferring User Card Data 20636TUCD which is described in FIG. 782*a* to Device B (S2).

Figure 782A:
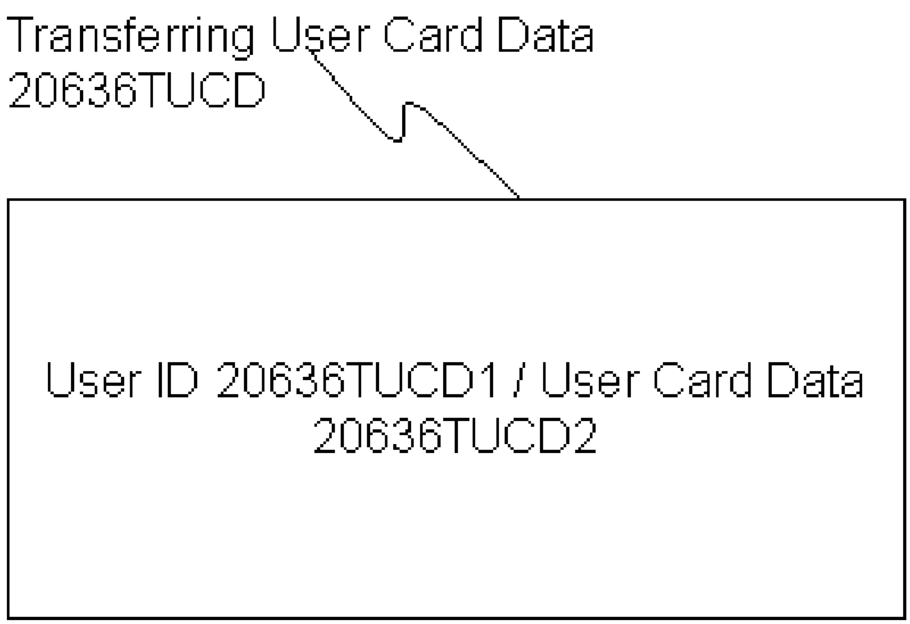

FIG. 782*a* illustrates the data included in Transferring User Card Data 20636TUCD described in S2 of FIG. 782. As described in the present drawing, Transferring User Card Data 20636TUCD includes User ID 20636TUCD1 and User Card Data 20636TUCD2. User ID 20636TUCD1 is the identification of the user of Communication Device 200 which is utilized for identifying Device A. User Card Data 20636TUCD2 is the data retrieved in S1 of FIG. 782.

FIG. 783 illustrates Other User Card Data Receiving Software 20636*c*2 (FIG. 781) of Device B. Referring to the present drawing, CPU 211 (FIG. 1) of Device B receives Transferring User Card Data 20636TUCD (FIG. 782*a*) sent by Device A described in S2 of FIG. 782 (S1). CPU 211 then retrieves User ID 20636TUCD1 and User Card Data 20636TUCD2 therefrom (S2), and stores these data in Other Users' Business Card Data Storage Area 20636*b*2 (FIG. 780) of Device B (S2).

<<Business Card Function—Summary>>

(1) A business card system comprising a sending communication device and a receiving communication device, said sending communication device comprises a microphone, a speaker, a display, an input device, a storage means, and a multiple mode implementor, wherein said multiple mode implementor implements a voice communication mode and a business card mode, said storage means stores a business card data, a series of audio data are input to and output from said microphone and said speaker respectively when said voice communication mode is implemented, said wireless communication device sends in a wireless fashion said business card data to said receiving communication device when said business card mode is implemented.

(2) A communication device comprising a microphone, a speaker, a display, an input device, a storage means and a multiple mode implementor, wherein said multiple mode implementor implements a voice communication mode and a business card mode, said storage means stores a business card data, a series of audio data are input to and output from said microphone and said speaker respectively when said voice communication mode is implemented, said wireless communication devices ends in a wireless fashion said business card data when said business card mode is implemented.

(3) A business card software program installed in a communication device comprising a microphone, a speaker, a display, an input device, a storage means and a multiple mode implementor, wherein said multiple mode implementor implements a voice communication mode and a business card mode, said storage means stores a business card data, a series of audio data are input to and output from said microphone and said speaker respectively when said voice communication mode is implemented, said wireless communication device sends in a wireless fashion said business card data under the control of said business card software when said business card mode is implemented.

<<Game Vibrating Function>>

FIGS. 784 through 786 illustrate the game vibrating function which vibrates Communication Device 200 when a predetermined condition is met while Communication Device 200 is executing a video game software program.

FIG. 784 illustrates another embodiment of the software program described in FIG. 283 stored in Game Software Storage Area 2061*d* (FIG. 141) to implement the shooting video game function (described in FIGS. 270 through 283) .When hit program is initiated as described in S4 of FIG. 282 (i.e., when User Controlled Object UCO (FIG. 270) is hit by CPU Fired Bullet CFB (FIG. 270)), CPU 211 (FIG. 1), first of all, activates Vibrator 217 (FIG. 1) (S1). Then CPU 211 displays an explosion image on LCD 201 (FIG. 1) by reading the three-dimensional data of CPU Fired Bullet CFB from 3D Object Data Storage Area 2061*e* (FIG. 141) and by 'pasting' the relevant textures thereto stored in Texture Data Storage Area 2061*f* (FIG. 141) (S2). Next, CPU 211 erases the image of User Controlled Object UCO from LCD 201 (S3), and also the explosion image (S4), and CPU 211 deactivates Vibrator 217 thereafter (S5).

FIG. 785 illustrates another embodiment of the software program described in FIG. 288 stored in Game Software Storage Area 2061*d* (FIG. 141) to implement the driving game function (FIGS. 284 through 294). As described in the present drawing, CPU 211 (FIG. 1) performs the user controlled car process (S1), the CPU controlled car process for all CPU Controlled Car CCCs (FIG. 284) displayed on LCD 201 (FIG. 1) (S2), the street image process (S3), and the background image process (S4). The details of each process are explained in FIGS. 289 through 292 respectively. Further, CPU 211 performs the vibrator controlling process which is described in FIG. 786 (S5).

FIG. 786 illustrates the vibrator controlling process described in S5 of FIG. 785. Referring to the present drawing, CPU 211 (FIG. 1) periodically checks the position of User Controlled Car UCC (FIG. 284) (S1). If User Controlled Car UCC is off the street or driving on a street of a bad condition (S2), CPU 211 activates Vibrator 217 (FIG. 1) (S3). For purposes of implementing the present function to driving video game, CPU 211 periodically checks the position of User Controlled Car UCC. CPU 211 also periodically checks the street condition by retrieving the data regarding the street condition from Street Parameter Storage Area 2061*g*2 (FIG. 286).

<<Game Vibrating Function—Summary>>

(1) A communication device comprising a microphone, a speaker, a display, an input device, a vibrator, and a multiple mode implementor, wherein said multiple mode implementor implements a voice communication mode and a video game mode, said vibrator is activated and vibrates when said communication device receives an incoming call and a series of sound data are input to and output from said microphone and said speaker respectively when said voice communication mode is implemented, a video game software program is executed and one or more of video game objects are displayed on said display and said vibrator is activated under the control of said video game software program when a predetermined condition is met when said video game mode is implemented.

(2) A video game software program which is stored in a host computer and which is designed to be downloaded to a communication device wherein said video game software program displays one or more of video game objects on a display of said communication device and a vibrator of said communication device is activated under the control of said video game software program when a predetermined condition is met.

(3) A host computer which stores a video game software program which is designed to be downloaded to a communication device wherein said video game software program displays one or more of video game objects on a display of said communication device and a vibrator of said communication device is activated under the control of said video game software program when a predetermined condition is met.

(4) Said video game in summary (1), (2), or (3) is a shooting video game.

(5) Said video game in summary (1), (2), or (3) is a driving video game.

<<Part-Time Job Finding Function>>

FIGS. 787 through 801 illustrates the part-timer finding function which enables the user of Communication Device 200 to find a part-time job in a convenient manner by utilizing Communication Device 200.

FIG. 787 illustrates the storage area included in Host H (FIG. 429). As described in the present drawing, Host H includes Part-timer Finding Information Storage Area H38*a* of which the data and software programs stored therein are described in FIG. 788.

FIG. 788 illustrates the storage areas included in Part-timer Finding Information Storage Area H38*a* (FIG. 787). As described in the present drawing, Part-timer Finding Information Storage Area H38*a* includes Part-timer Finding Data Storage Area H38*b* and Part-timer Finding Software Storage Area H38*c*. Part-timer Finding Data Storage Area H38*b* stores the data necessary to implement the present function on the side of Host H (FIG. 429), such as the ones described in FIGS. 789 through 791. Part-timer Finding Software Storage Area H38*c* stores the software programs necessary to implement the present function on the side of Host H, such as the ones described in FIG. 792.

FIG. 789 illustrates the storage areas included in Part-timer Finding Data Storage Area H38*b*(FIG. 788). As described in the present drawing, Part-timer Finding Data Storage Area H38*b* includes Part-timer Data Storage Area H38*b*1, Job Request Data Storage Area H38*b*2, Search Result Data Storage Area H38*b*3, Notice Data Storage Area H38*b*4, and Response Data Storage Area H38*b*5. Part-timer Data Storage Area H38*b*1 stores data described in FIG. 790. Job Request Data Storage Area H38*b*2 stores data described in FIG. 791. Search Result Data Storage Area H38*b*3 stores the result of the search performed in S2 of FIG. 793. Notice Data Storage Area H38*b*4 stores the notice data sent to the user of Communication Device 200 as described in S4 of FIG. 794. Response Data Storage Area H38*b*5 stores the response data sent by Communication Device 200 as described in S2 of FIG. 801.

FIG. 790 illustrates the data stored in Part-timer Data Storage Area H38*b*1 (FIG. 789). As described in the present drawing, Part-timer Data Storage Area H38*b*1 comprises five columns, i.e., 'Part-timer ID', 'Available Working Time', 'Available Worker Place', 'Mobile Phone #', and 'Email Address'. 'Part-timer ID' is the identification of the users of Communication Device 200 seeking for a part-time job. 'Available Working Time' is the available working time (or hours) of the user of Communication Device 200 of the corresponding 'Part-timer ID'. 'Available Worker Place', is the available working place (or geographical area) of the user of Communication Device 200 of the corresponding 'Part-timer ID'. 'Mobile Phone #' is the phone number of the user of Communication Device 200 of the corresponding 'Part-timer ID'. 'Email Address' is the email address of the user of Communication Device 200 of the corresponding 'Part-timer ID'. In the example described in the present drawing, the following data are stored in Part-timer Data Storage Area H38*b*1: 'Part-timer ID' H38*b*1PI1 of which 'Available Working Time', 'Available Worker Place', 'Mobile Phone #', and 'Email Address' are H38*b*1AWT1, H38*b*1AWP1, H38*b*1MP1, and H38*b*1EA1, respectively; 'Part-timer ID' H38*b*1PI2 of which 'Available Working Time', 'Available Worker Place', 'Mobile Phone #', and 'Email Address' are H38*b*1AWT2, H38*b*1AWP2, H38*b*1MP2, and H38*b*1EA2, respectively; 'Part-timer ID' H38*b*1PI3 of which 'Available Working Time', 'Available Worker Place', 'Mobile Phone #', and 'Email Address' are H38*b*1AWT3, H38*b*1AWP3, H38*b*1MP3, and H38*b*1EA3, respectively; 'Part-timer ID' H38*b*1PI4 of which 'Available Working Time', 'Available Worker Place', 'Mobile Phone #', and 'Email Address' are H38*b*1AWT4, H38*b*1AWP4, H38*b*1MP4, and H38*b*1EA4, respectively; 'Part-timer ID' H38*b*1PI5 of which 'Available Working Time', 'Available Worker Place', 'Mobile Phone #', and 'Email Address' are H38*b*1AWT5, H38*b*1AWP5, H38*b*1MP5, and H38*b*1EA5, respectively; 'Part-timer ID' H38*b*1PI6 of which 'Available Working Time', 'Available Worker Place', 'Mobile Phone #', and 'Email Address' are H38*b*1AWT6, H38*b*1AWP6, H38*b*1MP6, and H38*b*1EA6, respectively; and 'Part-timer ID' H38*b*1PI7 of which 'Available Working Time', 'Available Worker Place', 'Mobile Phone #', and 'Email Address' are H38*b*1AWT7, H38*b*1AWP7, H38*b*1MP7, and H38*b*1EA7, respectively.

FIG. 791 illustrates the data stored in Job Request Data Storage Area H38*b*2 (FIG. 789). As described in the present drawing, Job Request Data Storage Area H38*b*2 comprises two columns, i.e., 'Requested Working Time' and 'Requested Working Place'. 'Requested Working Time' is the working time (or hours) for which the potential hirer seeks the potential part-timer to work (e.g., from 12:00 noon till 4:00 p.m.). 'Requested Working Place' is the working place (or the geographical area) where the potential hirer seeks the potential part-timer to work. In the example described in the present drawing, 'Requested Working Time' is H38*b*2RWT1, and 'Requested Working Place' is H38*b*2RWP1.

FIG. 792 illustrates the software programs stored in Part-timer Finding Software Storage Area H38*c* (FIG. 788). As described in the present drawing, Part-timer Finding Software Storage Area H38*c* stores Matched Part-timer Finding Software H38*c*1 and Notice Data Sending Software H38*c*2. Matched Part-timer Finding Software H38*c*1 is a software program described in FIG. 793. Notice Data Sending Software H38*c*2 is a software program described in FIG. 794.

FIG. 793 illustrates Matched Part-timer Finding Software H38*c*1 (FIG. 792) which is utilized to find the potential part-timer which matches with the condition set by the potential hirer. Referring to the present drawing, Host H (FIG. 429), first of all, retrieves the request data which describes the condition set by the potential hirer from Job Request Data Storage Area H38*b*2 (FIG. 791) (S1). Host H retrieves 'Requested Working Time' H38*b*2RWT1 and 'Requested Working Place' H38*b*2RWP1 and compares these data with the ones stored in 'Available Working Time' and 'Available Worker Place' stored in Part-timer Data Storage Area H38*b*1 (FIG. 790), respectively (S2). Host H stores the search result data which represents the search result of the search described in S2 in Search Result Data Storage Area H38*b*3 (FIG. 789) (S3).

FIG. 794 illustrates Notice Data Sending Software H38*c*2 (FIG. 792) which is utilized to send a notice data to notify the user of Communication Device 200 who is included in the search result data described in S3 of FIG. 793 indicating that he/she is a candidate to a part-time job. Referring to the present drawing, Host H (FIG. 429) retrieves Search Result Data from Search Result Data Storage Area H38*b*3 (FIG. 789) (S1). Next, Host H retrieves the email address of the user from Part-timer Data Storage Area H38*b*1 (FIG. 789) (S2). A notice data indicating that he/she is an candidate of a part-time job is retrieved from Notice Data Storage Area H38*b*4 f (FIG. 789) (S3), and the notice data is sent to the email address retrieved in S2 (S4).

FIG. 795 illustrates the storage area included in RAM 206 (FIG. 1) of Communication Device 200 owned by the user described in FIG. 794. As described in the present drawing, RAM 206 includes Part-timer Finding Information Storage Area 20638*a* of which the data and software programs stored therein are described in FIG. 796.

The data and software programs stored in Part-timer Finding Information Storage Area 20638*a*(FIG. 795) are downloaded from Host H (FIG. 429) in the manner described in FIGS. 401 through 407.

FIG. 796 illustrates the storage areas included in Part-timer Finding Information Storage Area 20638*a* f (FIG. 795). As described in the present drawing, Part-timer Finding Information Storage Area 20638*a* includes Part-timer Finding Data Storage Area 20638*b* and Part-timer Finding Software Storage Area 20638*c*. Part-timer Finding Data Storage Area 20638*b* stores the data necessary to implement the present function on the side of Communication Device 200, such as the ones described in FIGS. 797 through 798. Part-timer Finding Software Storage Area 20638*c* stores the software programs necessary to implement the present function on the side of Communication Device 200, such as the ones described in FIG. 799.

FIG. 797 illustrates the storage areas included in Part-timer Finding Data Storage Area 20638*b*(FIG. 796). As described in the present drawing, Part-timer Finding Data Storage Area 20638*b* includes Part-timer Data Storage Area 20638*b*1, Notice Data Storage Area 20638*b*4, and Response Data Storage Area 20638*b*5. Part-timer Data Storage Area 20638*b*1 is the storage area described in FIG. 798. Notice Data Storage Area 20638*b*4 is the storage area to store the notice data sent from Host H (FIG. 429) as described in S4 of FIG. 794. Response Data Storage Area 20638*b*5 is the storage area to store the response data sent to Host H as described in S2 of FIG. 801.

FIG. 798 illustrates the data stored in Part-timer Data Storage Area 20638*b*1 (FIG. 797). As described in the present drawing, Part-timer Data Storage Area 20638*b*1 comprises five columns, i.e., 'Part-timer ID', 'Available Working Time', 'Available Worker Place', 'Mobile Phone #', and 'Email Address'. 'Part-timer ID' is the identification of the users of Communication Device 200 (i.e., the user described in FIG. 794). 'Available Working Time' is the available working time (or hours) of the user. 'Available Worker Place', is the available working place (or geographical area) of the user. 'Mobile Phone #' is the phone number of the user. 'Email Address' is the email address of the user. In the example described in the present drawing, 'Part-timer ID' 20638*b*1PI1 of which 'Available Working Time', 'Available Worker Place', 'Mobile Phone #', and 'Email Address' are 20638*b*1AWT1, 20638*b*1AWP1, 20638*b*1MP1, and 20638*b*1EA1, respectively, are stored in Part-timer Data Storage Area 20638*b*1. In the present example, 'Part-timer ID' 20638*b*1PI1 is identical to 'Part-timer ID' H38*b*1PI1 stored in Part-timer Data Storage Area H38*b*1 (FIG. 790) of Host H (FIG. 429). Therefore, 'Available Working Time' 20638*b*1AWT1, 'Available Worker Place' 20638*b*1AWP1, 'Mobile Phone #' 20638*b*1MP1, and 'Email Address' 20638*b*1EA1 are identical to 'Available Working Time' H38*b*1AWT1, 'Available Worker Place' H38*b*1AWP1, 'Mobile Phone #' H38*b*1MP1, and 'Email Address' H38*b*1EA1, respectively.

FIG. 799 illustrates the software programs stored in Part-timer Finding Software Storage Area 20638*c* (FIG. 796). As described in the present drawing, Part-timer Finding Software Storage Area 20638*c* stores Response Data Input Software 20638*c*1 and Response Data Sending Software 20638*c*2. Response Data Input Software 20638*c*1 is the software program described in FIG. 800. Response Data Sending Software 20638*c*2 is the software program described in FIG. 801.

FIG. 800 illustrates Response Data Input Software 20638*c*1 stored in Part-timer Finding Software Storage Area 20638*c* (FIG. 799) which produces the response data. Referring to the present drawing, CPU 211 (FIG. 1) displays a response data input screen to which the user of Communication Device 200 (i.e., the user described in FIG. 794) inputs the response data (S1). The user inputs the response data by utilizing Input Device 210 (FIG. 1) or via voice recognition system (S2), and the response data is stored in Response Data Storage Area 20638*b*5 (FIG. 797) (S3). The response data represents the answer (e.g., 'Yes, I will take the job' or 'No, I will not take the job) to the notice data sent from Host H (FIG. 429) as described in S4 of FIG. 794.

FIG. 801 illustrates Response Data Sending Software 20638*c*2 stored in Part-timer Finding Software Storage Area 20638*c* (FIG. 799) which sends to Host H (FIG. 429) the response data produced in S2 of FIG. 800. As described in the present drawing, CPU 211 (FIG. 1) retrieves the response data from Response Data Storage Area 20638*b*5 (FIG. 797) (S1), which is sent to Host H (S2). Host H receives the response data thereafter, which is stored in Response Data Storage Area H38*b*5 (FIG. 789).

<<Part-Time Job Finding Function—Summary>>

(1) A host computer comprising a part-timer data storage area wherein said part-timer data storage area stores a plurality of part-time data, said host computer searches said part-timer data storage area for the part-timer data which matches with a certain condition, and said host computer sends a notice based on said part-timer data which matches said certain condition.

(2) A part-time worker finding system comprising a host computer and a communication device, wherein said host computer comprises a part-timer data storage area, said part-timer data storage area stores a plurality of part-time data, said host computer searches said part-timer data storage area for the part-timer data which matches a certain condition, said host computer sends a notice based on said part-timer data which matches with said certain condition, said communication device receives said notice, said communication device is input a response data, and said communication device sends said response data to said host computer.

<<Parking Lot Finding Function>>

FIGS. 802 through 832 illustrates the parking lot finding function which enables Communication Device 200 to display the closest parking lot with vacant spaces on LCD 201 (FIG. 1) with the best route thereto.

FIG. 802 illustrates the connection between Host H (FIG. 429) and a plurality of parking lots. As described in the present drawing, Host H is connected to Parking Lot Computer PLC39*a*, Parking Lot Computer PLC39*b*, Parking Lot Computer PLC39*c* via Network NT (e.g., the Internet). Parking Lot Computer PLC39*a* is a computer which monitors the vacancy of Parking Lot PL39*a*. Parking Lot Computer PLC39*b* is a computer which monitors the vacancy of Parking Lot PL39*b*. Parking Lot Computer PLC39*c* is a computer which monitors the vacancy of Parking Lot PL39*c*. Parking Lot PL39*a*, Parking Lot PL39*b*, and Parking Lot PL39*c* are parking lots and each of which includes a plurality of parking spaces for parking automobiles.

FIG. 803 illustrates the storage area included in Parking Lot Computer PLC39*a* (FIG. 802). As described in the present drawing, Parking Lot Computer PLC39*a* includes Parking Lot Information Storage Area PLC39*a* of which the data and the software programs stored therein are described in are described in FIG. 804. Primarily, Parking Lot Computer PLC39*b* (FIG. 802) and Parking Lot Computer PLC39*c* (FIG. 802) store the same data and software programs as the ones stored in Parking Lot Computer PLC39*a* (FIG. 802).

FIG. 804 illustrates the storage areas included in Parking Lot Information Storage Area PLC39*a* (FIG. 803). As described in the present drawing, Parking Lot Information Storage Area PLC39*a* includes Parking Lot Data Storage Area PLC39 band Parking Lot Software Storage Area PLC39*c*. Parking Lot Data Storage Area PLC39*b* stores the data necessary to implement the present function on the side of Parking Lot Computer PLC39*a* (FIG. 802), such as the ones described in FIG. 805. Parking Lot Software Storage Area PLC39*c* stores the software programs necessary to implement the present function on the side of Parking Lot Computer PLC39*a*, such as the one described in FIG. 806.

FIG. 805 illustrates the data stored in Parking Lot Data Storage Area PLC39*b* (FIG. 804). As described in the present drawing, Parking Lot Data Storage Area PLC39*b* includes five types of data, i.e., 'Parking Lot ID', 'Total Spaces', 'Vacancy Data', 'Street Address', and 'Location Data'. 'Parking Lot ID' represents the identification of Parking Lot PL39*a*. 'Total Spaces' represents the total parking spaces included in Parking Lot PL39*a*. 'Vacancy Data' represents the data representing the number of vacant parking spaces included in Parking Lot PL39*a*. 'Street Address' represents the street address of Parking Lot PL39*a*. 'Location Data' represents the geographic location of Parking Lot PL39*a*. In the present example, Parking Lot Data Storage Area PLC39*b* stores 'Parking Lot ID' PL39*a*, 'Total Spaces' PL39*b*1TS1, 'Vacancy Data' PL39*b*1VD1, 'Street Address' PL39*b*1SA1, and 'Location Data' PL39*b*1LD1.

FIG. 806 illustrates the software program stored in Parking Lot Software Storage Area PLC39*c*(FIG. 804). As described in the present drawing, Parking Lot Software Storage Area PLC39*c* stores Parking Lot Data Sending Software PLC39*c*1 which is described in FIG. 819.

FIG. 807 illustrates the storage area included in Host Information Storage Area H00*a* (FIG. 429) of Host H (FIG. 429). As described in the present drawing, Host Information Storage Area H00*a* includes Parking Lot Finding Information Storage Area H39*a* of which the data and the software programs stored therein are described in FIG. 808.

FIG. 808 illustrates the storage areas included in Parking Lot Finding Information Storage Area H39*a*(FIG. 807) of Host H (FIG. 429). As described in the present drawing, Parking Lot Finding Information Storage Area H39*a* includes Parking Lot Finding Data Storage Area H39*b* and Parking Lot Finding Software Storage Area H39*c*. Parking Lot Finding Data Storage Area H39*b* stores the data necessary to implement the present function on the side of Host H, such as the ones described in FIGS. 809 through 811. Parking Lot Finding Software Storage Area H39*c* stores the software programs necessary to implement the present function on the side of Host H, such as the ones described in FIG. 812.

FIG. 809 illustrates the storage areas included in Parking Lot Finding Data Storage Area H39*b* (FIG. 808). As described in the present drawing, Parking Lot Finding Data Storage Area H39*b* includes Parking Lot Data Storage Area H39*b*1, Map Data Storage Area H39*b*2, Selected Parking Lot Data Storage Area H39*b*3, and Best Route Data Storage Area H39*b*4. Parking Lot Data Storage Area H39*b*1 stores the data described in FIG. 811. Map Data Storage Area H39*b*2 stores the map data including the surrounding area of Parking Lot PL39*a* (FIG. 802), Parking Lot PL39*b* (FIG. 802), and Parking Lot PL39*c* (FIG. 802). Selected Parking Lot Data Storage Area H39*b*3 stores the data described in FIG. 818. Best Route Data Storage Area H39*b*4 stores the data representing the best route from the current geographical location of Communication Device 200 to the selected parking lot of which the details are described in FIG. 824.

FIG. 810 illustrates the data stored in Selected Parking Lot Data Storage Area 20639*b*3(FIG. 809). As described in the present drawing, Selected Parking Lot Data Storage Area 20639*b*3 stores the identification of the parking lot selected by utilizing the present function.

FIG. 811 illustrates the data stored in Parking Lot Data Storage Area H39*b*1 (FIG. 809). As described in the present drawing, Parking Lot Data Storage Area H39*b*1 includes five columns, i.e., 'Parking Lot ID', 'Total Spaces', 'Vacancy Data', 'Street Address', and 'Location Data'. 'Parking Lot ID' represents the identifications of the parking lots. 'Total Spaces' represents the total number of the parking spaces included in each parking lot. 'Vacancy Data' represents the number of the vacant parking spaces included in each parking lot. 'Street Address' is the street address of each parking lot. 'Location Data' represents the geographic location of each parking lot. In the present example described in the present drawing, Parking Lot Data Storage Area H39*b*1 stores the following data: 'Parking Lot ID' PL39*a* of which 'Total Spaces', 'Vacancy Data', 'Street Address', and 'Location Data' are PL39*b*1TS1, PL39*b*1VD1, PL39*b*1SA1, PL39*b*1LD1, respectively; 'Parking Lot ID' PL39*b* of which 'Total Spaces', 'Vacancy Data', 'Street Address', and 'Location Data' are PL39*b*1TS2, PL39*b*1VD2, PL39*b*1SA2, PL39*b*1LD2, respectively; and 'Parking Lot ID' PL39*c* of which 'Total Spaces', 'Vacancy Data', 'Street Address', and 'Location Data' are PL39*b*1TS3, PL39*b*1VD3, PL39*b*1SA3, PL39*b*1LD3, respectively.

FIG. 812 illustrates the software programs stored in Parking Lot Finding Software Storage Area H39*c* (FIG. 804). As described in the present drawing, Parking Lot Finding Software Storage Area H39*c* stores Parking Lot Data Updating Software H39*c*1, Parking Lot Data Sending Software H39*c*2, Parking Lot Selecting Software H39*c*3, and Selected Parking Lot Data Sending Software H39*c*4. Parking Lot Data Updating Software H39*c*1 is the software program described in FIG. 820. Parking Lot Data Sending Software H39*c*2 is the software program described in FIG. 821. Parking Lot Selecting Software H39*c*3 is the software program described in FIG. 826. Selected Parking Lot Data Sending Software H39*c*4 is the software program described in FIG. 827.

FIG. 813 illustrates the storage area included in RAM 206 (FIG. 1). As described in the present drawing, RAM 206 includes Parking Lot Finding Information Storage Area 20639*a* of which the data and the software programs stored therein are described in FIG. 814.

The data and software programs stored Parking Lot Finding Information Storage Area 20639*a* (FIG. 813) are downloaded from Host H (FIGS. 429 and/or 802) in the manner described in FIGS. 401 through 407.

FIG. 814 illustrates the storage areas included in Parking Lot Finding Information Storage Area 20639*a* (FIG. 813). As described in the present drawing, Parking Lot Finding Information Storage Area 20639*a* includes Parking Lot Finding Data Storage Area 20639*b* and Parking Lot Finding Software Storage Area 20639*c*. Parking Lot Finding Data Storage Area 20639*b* stores the data necessary to implement the present function on the side of Communication Device 200, such as the ones described in FIGS. 815 and 816. Parking Lot Finding Software Storage Area 20639*c* stores the software programs necessary to implement the present function on the side of Communication Device 200, such as the ones described in FIG. 817.

FIG. 815 illustrates the storage areas included in Parking Lot Finding Data Storage Area 20639*b* (FIG. 814). As described in the present drawing, Parking Lot Finding Data Storage Area 20639*b* includes Parking Lot Data Storage Area 20639*b*1, Map Data Storage Area 20639*b*2, Selected Parking Lot Data Storage Area 20639*b*3, and Best Route Data Storage Area 20639*b*4. Parking Lot Data Storage Area 20639*b*1 stores the data described in FIG. 816. Map Data Storage Area 20639*b*2 stores the map data of each and every location in the U.S. Selected Parking Lot Data Storage Area 20639*b*3 stores the data described in FIG. 818. Best Route Data Storage Area 20639*b*4 stores the data calculated in S4 of FIG. 824 representing the best route from the current geographical location of Communication Device 200 to the selected parking lot.

FIG. 816 illustrates the data stored in Parking Lot Finding Data Storage Area 20639*b*(FIG. 815). As described in the present drawing, Parking Lot Finding Data Storage Area 20639*b* includes five columns, i.e., 'Parking Lot ID', 'Total Spaces', 'Vacancy Data', 'Street Address', and 'Location Data'. 'Parking Lot ID' represents the identifications of the parking lots. 'Total Spaces' represents the total number of the parking spaces included in each parking lot. 'Vacancy Data' represents the number of the vacant parking spaces included in each parking lot. 'Street Address' is the street address of each parking lot. 'Location Data' represents the geographic location of each parking lot. In the present example described in the present drawing, Parking Lot Data Storage Area H39*b*1 stores the following data: 'Parking Lot ID' PL39*a* of which 'Total Spaces', 'Vacancy Data', 'Street Address', and 'Location Data' are PL39*b*1TS1, PL39*b*1VD1, PL39*b*1SA1, PL39*b*1LD1, respectively; 'Parking Lot ID' PL39*b* of which 'Total Spaces', 'Vacancy Data', 'Street Address', and 'Location Data' are PL39*b*1TS2, PL39*b*1VD2, PL39*b*1SA2, PL39*b*1LD2, respectively; and 'Parking Lot ID' PL39*c* of which 'Total Spaces', 'Vacancy Data', 'Street Address', and 'Location Data' are PL39*b*1TS3, PL39*b*1VD3, PL39*b*1SA3, PL39*b*1LD3, respectively. The data stored in Parking Lot Finding Data Storage Area 20639*b* are not necessarily identical to the ones stored in Parking Lot Data Storage Area H39*b*1 (FIG. 811).

FIG. 817 illustrates the software programs stored in Parking Lot Finding Software Storage Area 20639*c* f (FIG. 814). As described in the present drawing, Parking Lot Finding Software Storage Area 20639*c* stores Parking Lot Data Receiving Software 20639*c*1, Parking Lot Selecting Software 20639*c*2, Selected Parking Lot Displaying Software 20639*c*3, and Selected Parking Lot Data Receiving Software 20639*c*4. Parking Lot Data Receiving Software 20639*c*1 is the software program described in FIG. 823. Parking Lot Selecting Software 20639*c*2 is the software program described in FIG. 824. Selected Parking Lot Displaying Software 20639*c*3 is the software program described in FIG. 825. Selected Parking Lot Data Receiving Software 20639*c*4 is the software program described in FIG. 829.

FIG. 818 illustrates the data stored in Selected Parking Lot Data Storage Area 20639*b*3 (FIG. 815). As described in the present drawing, Selected Parking Lot Data Storage Area 20639*b*3 stores the identification of the parking lot selected by utilizing the present function.

FIG. 819 illustrates Parking Lot Data Sending Software PLC39*c*1 stored in Parking Lot Software Storage Area PLC39*c* (FIG. 806) of Parking Lot Computer PLC39*a* (FIG. 802). As described in the present drawing, Parking Lot Computer PLC39*a* retrieves the parking lot data (i.e., 'Parking Lot ID' PL39*a*, 'Total Spaces' PL39*b*1TS1, 'Vacancy Data' PL39*b*1VD1, 'Street Address' PL39*b*1SA1, and 'Location Data' PL39*b*1LD1) from Parking Lot Data Storage Area PLC39*b* (FIG. 805) (S1). The parking lot data is sent to Host H (FIGS. 429 and/or 802) thereafter (S2). The sequence of S1 and S2 is executed periodically by all parking lot computers (i.e., Parking Lot Computer PLC39*a*, Parking Lot Computer PLC39*b*, and Parking Lot Computer PLC39*c*).

FIG. 820 illustrates Parking Lot Data Updating Software H39*c*1 stored in Parking Lot Finding Software Storage Area H39*c*(FIG. 812) of Host H (FIGS. 429 and/or 802). As described in the present drawing, Host H receives the parking lot data sent in the manner described in S2 of FIG. 819 (S1). Host H retrieves the parking lot data therefrom (S2), and updates Parking Lot Data Storage Area H39*b*1 (FIG. 811) (S3).

FIG. 821 illustrates Parking Lot Data Sending Software H39*c*2 stored in Parking Lot Finding Software Storage Area H39*c* (FIG. 812) of Host H (FIGS. 429 and/or 802). As described in the present drawing, Host H retrieves the parking lot data from Parking Lot Data Storage Area H39*b*1 (FIG. 811) (S1). Next, Host H retrieves the map data from Map Data Storage Area H39*b*2 (FIG. 809) (S2). Host H produces Parking Lot & Map Data 20639PLMD from these data and sends to Communication Device 200 Parking Lot & Map Data 20639PLMD which is described in FIG. 822 (S3).

FIG. 822 illustrates the data included in Parking Lot & Map Data 20639PLMD described in S3 of FIG. 821. As described in the present drawing, Parking Lot & Map Data 20639PLMD includes Parking Lot Data 20639PLMD1 and Map Data 20639PLMD2. Parking Lot Data 20639PLMD1 is the data retrieved in Si of FIG. 821, and Map Data 20639PLMD2 is the data retrieved in S2 of FIG. 821.

FIG. 823 illustrates Parking Lot Data Receiving Software 20639*c*1 stored in Parking Lot Finding Software Storage Area 20639*c* (FIG. 817) of Communication Device 200. As described in the present drawing, CPU 211 (FIG. 1) receives Parking Lot & Map Data 20639PLMD (FIG. 822) from Host H (FIGS. 429 and/or 802) (S1). CPU 211 next retrieves Parking Lot Data 20639PLMD1 (FIG. 822) and stores the data in Parking Lot Data Storage Area 20639*b*1 (FIG. 816) (S2). CPU 211 then retrieves Map Data 20639PLMD2 (FIG. 822) and stores the data in Map Data Storage Area 20639*b*2 (FIG. 815) (S3).

FIG. 824 illustrates Parking Lot Selecting Software 20639*c*2 stored in Parking Lot Finding Software Storage Area 20639*c* (FIG. 817) of Communication Device 200. As described in the present drawing, CPU 211 (FIG. 1) calculates the current geographical location by utilizing the method so-called 'GPS' described hereinbefore (S1), and searches for the closest parking lot which has vacant parking space by scanning the data stored in Parking Lot Data Storage Area 20639*b*1 (FIG. 816) (S2). CPU 211 selects the closest parking lot (S3), and calculates the best route data which represents the best route from the current geographical location to the parking lot selected in S3 (S4). CPU 211 stores the identification of the parking lot selected in S3 as the selected parking lot data in Selected Parking Lot Data Storage Area **20639*b*3 (FIG. 818) (S5). CPU 211 further stores the best route data in Best Route Data Storage Area 20639*b*4 (FIG. 815**) (S6).

FIG. 825 illustrates Selected Parking Lot Displaying Software **20639*c*3 stored in Parking Lot Finding Software Storage Area 20639*c* (FIG. 817) of Communication Device 200. As described in the present drawing, CPU 211 (FIG. 1) retrieves the map data from Map Data Storage Area 20639*b*2 (FIG. 815) (S1), and displays the map data on LCD 201 (FIG. 1) (S2). Next, CPU 211 retrieves the selected parking lot data from Selected Parking Lot Data Storage Area 20639*b*3 (FIG. 818), and displays a symbol (image data) on the map data where the selected parking lot is located (S4). CPU 211 then retrieves the parking lot data from Parking Lot Data Storage Area 20639*b*1 (FIG. 816) (S5), and displays the data on LCD 201 (S6). Assuming that the selected parking lot (the parking lot selected in S3 of FIG. 824) is Parking Lot PL39*a*, CPU 211 retrieves from Parking Lot Data Storage Area H39*b*1 (FIG. 811) and displays on LCD 201 the following data: 'Parking Lot ID' PL39*a*, 'Total Spaces' PL39*b*1TS1, 'Vacancy Data' PL39*b*1VD1, 'Street Address' PL39*b*1SA1, and 'Location Data' PL39*b*1LD1. CPU 211 further retrieves the best route data from Best Route Data Storage Area 20639*b*4 (FIG. 815) (S7), and displays the data on LCD 201 (S8). The best route data may be displayed with a red line from the current geographical location of Communication Device 200** to the selected parking lot.

<<Parking Lot Finding Function—Other Embodiments>>

FIGS. 826 through 830 illustrate another embodiment of the present function.

FIG. 826 illustrates both Parking Lot Selecting Software **20639*c*2 stored in Parking Lot Finding Software Storage Area 20639*c* (FIG. 817) of Communication Device 200 and Parking Lot Selecting Software H39*c*3 stored in Parking Lot Finding Software Storage Area H39*c*(FIG. 812) of Host H (FIGS. 429 and/or 802). Referring to the present drawing, CPU 211 (FIG. 1) of Communication Device 200 calculates the current geographical location by utilizing the method so-called 'GPS' described hereinbefore, and sends the current geographical location data (S1), which is received by Host H (S2). Host H searches for the closest parking lot which has vacant parking space by scanning the data stored in Parking Lot Data Storage Area H39*b*1 (FIG. 811) (S3). Host H selects the closest parking lot (S4), and calculates the best route data which represents the best route from the current geographical location to the parking lot selected in S4 (S5). Host H stores the identification of the parking lot selected in S3 as the selected parking lot data in Selected Parking Lot Data Storage Area 20639*b*3 (FIG. 810) (S6). Host H further stores the best route data in Best Route Data Storage Area H39*b*4 (FIG. 809**) (S7).

FIG. 827 illustrates Selected Parking Lot Data Sending Software H**39*c*4 stored in Parking Lot Finding Software Storage Area H39*c* (FIG. 812) of Host H (FIGS. 429 and/or 802). Referring to the present drawing, Host H retrieves the selected parking lot data from Selected Parking Lot-Data Storage Area H39*b*3 (FIG. 810) (S1). Host H retrieves the map data from Map Data Storage Area H39*b*2 (FIG. 809) (S2). Host H further retrieves the best route data from Best Route Data Storage Area H39*b*4 (FIG. 809) (S3). Host H then produces and sends to Communication Device 200 Selected Parking Lot & Map Data 20639SPLMD of which the data stored therein are described in FIG. 828** (S4).

FIG. 828 illustrates the data stored in Selected Parking Lot & Map Data 20639SPLMD described in S4 of FIG. 827. As described in the present drawing, Selected Parking Lot & Map Data 20639SPLMD includes Selected Parking Lot Data 20639SPLMD1, Map Data 20639SPLMD2, and Best Route Data 20639SPLMD3. Selected Parking Lot Data 20639SPLMD1 is the data retrieved in S1 of FIG. 827, Map Data 20639SPLMD2 is the data retrieved in S2 of FIG. 827, and Best Route Data 20639SPLMD3 is the data retrieved in S3 of FIG. 827.

FIG. 829 illustrates Selected Parking Lot Data Receiving Software **20639*c*4 stored in Parking Lot Finding Software Storage Area 20639*c* (FIG. 817) of Communication Device 200. Referring to the present drawing, CPU 211 (FIG. 1) receives Selected Parking Lot & Map Data 20639SPLMD (FIG. 828) from Host H (FIGS. 429 and/or 802) (S1). CPU 211 retrieves Selected Parking Lot Data 20639SPLMD1 therefrom and stores the data in Selected Parking Lot Data Storage Area 20639*b*3 (FIG. 810) (S2). CPU 211 then retrieves Map Data 20639PLMD2 from Selected Parking Lot & Map Data 20639SPLMD (FIG. 828) and stores the data in Map Data Storage Area 20639*b*2 (FIG. 815) (S3). CPU 211 further retrieves the best route data 20639SPLMD3 from Selected Parking Lot & Map Data 20639SPLMD and stores the data in Best Route Data Storage Area 20639*b*4 (FIG. 815**) (S4).

FIG. 830 illustrates Selected Parking Lot Displaying Software **20639*c*3 stored in Parking Lot Finding Software Storage Area 20639*c* (FIG. 817) of Communication Device 200. As described in the present drawing, CPU 211 (FIG. 1) retrieves the map data from Map Data Storage Area 20639*b*2 (FIG. 815) (S1), and displays the map data on LCD 201 (FIG. 1) (S2). Next, CPU 211 retrieves the selected parking lot data from Selected Parking Lot Data Storage Area 20639*b*3 (FIG. 818) (S3), and displays a symbol (image data) on the map data where the selected parking lot is located (S4). CPU 211 then retrieves the parking lot-data from Parking Lot Data Storage Area 20639*b*1 (FIG. 816) (S5), and displays the data on the map data (S6). Assuming that the selected parking lot (the parking lot selected in S3 of FIG. 824) is Parking Lot PL39*a*, CPU 211 retrieves from Parking Lot Data Storage Area H39*b*1 (FIG. 811) and displays on LCD 201 the following data: 'Parking Lot ID' PL39*a*, 'Total Spaces' PL39*b*1TS1, 'Vacancy Data' PL39*b*1VD1, 'Street Address' PL39*b*1SA1, and 'Location Data' PL39*b*1LD1. CPU 211 further retrieves the best route data from Best Route Data Storage Area 20639*b*4(FIG. 815) (S7), and displays the data on LCD 201 (S8). The best route data may be displayed with a red line from the current geographical location of Communication Device 200** to the selected parking lot.

FIG. 831 illustrates another embodiment of the sequence described in FIG. 824. Communication Device 200 receives the row GPS data via Antenna 218 (FIG. 1) and CPU 211 (FIG. 1) of Communication Device 200 sends the data to Host H (FIGS. 429 and/or 802) at which the current geographical location is calculated, and the result of the calculation is sent to Communication Device 200 (S1). CPU 211 of Communication Device 200 searches for the closest parking lot, based on the data received in S1 which represents the current geographical location, which has vacant parking space by scanning the data stored in Parking Lot Data Storage Area **20639*b*1 (FIG. 816) (S2). CPU 211 selects the closest parking lot (S3), and calculates the best route data which represents the best route from the current geographical location to the parking lot selected in S3 (S4). CPU 211 stores the identification of the parking lot selected in S3 as the selected parking lot data in Selected Parking Lot Data Storage Area 20639*b*3 (FIG. 818) (S5). CPU 211 further stores the best route data in Best Route Data Storage Area 20639*b*4 (FIG. 815**) (S6).

FIG. 832 illustrates another embodiment of the connection between Host H (FIGS. 429 and/or 802) and a plurality of parking lots. As described in the present drawing, Host H is connected to Parking Lot Computer PLC39*a* via Network NT (e.g., the Internet). Referring to the present drawing, Parking Lot Computer PLC39*a* monitors the vacancy of all parking lots, i.e., Parking Lot PL39*a*, Parking Lot PL39*b*, and Parking Lot PL39*c*.

<<Parking Lot Finding Function—Summary>>

(1) A parking lot finding system comprising a host computer and a communication device wherein said host computer stores a parking lot data representing the number of the vacancy spaces in a plurality of parking lots, the current geographical location of said communication device is calculated, a parking lot with vacant space closest to said current geographical location is selected from said plurality of parking lots, a route from said current geographical location to said parking lot is calculated, and a map data with the location of said parking lot and said route indicated on said map is displayed on a display of said communication device.

(2) A communication device comprising a microphone, a speaker, a display, an input device and a multiple mode implementor, wherein said multiple mode implementor implements a voice communication mode and a parking lot finding mode, a series of audio data are input to and output from said microphone and said speaker respectively when said voice communication mode is implemented, a map data is displayed on a display of said communication device together with a first image data which represents the geographical location of the closest parking lot with vacant space from the current geographical location of said communication device and a second image data which represents a route from said current geographical location of said communication device to said geographical location of the closest parking lot with vacant space when said parking lot finding mode is implemented.

(3) A parking lot finding software program which displays a map data on a display of a communication device together with a first image data which represents the geographical location of the closest parking lot with vacant space from the current geographical location of said communication device and a second image data which represents a route from said current geographical location of said communication device to said geographical location of the closest parking lot with vacant space.

<<Parts Upgradable Communication Device>>

FIGS. 833*a* through 833*x* illustrate the parts upgradable Communication Device 200 which enables all elements described in FIGS. 467*a* through 467*d* to be replaced and upgraded.

FIG. 833*a* illustrates the replacable and upgradable CCD Unit 214 (FIGS. 467*a* through 467*d*) of Communication Device 200. As described in the present drawing, CCD Unit 214 is connected to Data Bus 203 via CCD Unit Connector 214*a* and CCD Unit Connector 214*b*. CCD Unit Connector 214*a* is detachably connected to CCD Unit Connector 214*b*. Therefore, CCD Unit 214 can be replaced to a new one by disconnecting CCD Unit Connector 214*a* from CCD Unit Connector 214*b*.

FIG. 833*b* illustrates the replacable and upgradable Vibrator 217 (FIGS. 467*a* through 467*d*) of Communication Device 200. As described in the present drawing, Vibrator 217 is connected to Data Bus 203 via Vibrator Connector 217*a* and Vibrator Connector 217*b* Vibrator Connector 217*b*. Vibrator Connector 217*a* is detachably connected to Vibrator Connector 217*b*. Therefore, Vibrator 217 can be replaced to a new one by disconnecting Vibrator Connector 217*a* from Vibrator Connector 217*b*.

FIG. 833*c* illustrates the replacable and upgradable Input Device 210 (FIGS. 467*a* through 467*d*) of Communication Device 200. As described in the present drawing, Input Device 210 is connected to Data Bus 203 via Input Device Connector 210*a* and Input Device Connector 210*b* Vibrator Connector 217*b*. Input Device Connector 210*a* is detachably connected to Input Device Connector 210*b* Input Device Connector 210*b*. Therefore, Input Device 210 can be replaced to a new one by disconnecting Input Device Connector 210*a* from Input Device Connector 210*b*.

FIG. 833*d* illustrates the replacable and upgradable CPU 211 (FIGS. 467*a* through 467*d*) of Communication Device 200. As described in the present drawing, CPU 211 is connected to Data Bus 203 via CPU Connector 211*a* and CPU Connector 211*b*. CPU Connector 211*a* is detachably connected to CPU Connector 211*b*. Therefore, CPU 211 can be replaced to a new one by disconnecting CPU Connector 211*a* from CPU Connector 211*b*.

FIG. 833*e* illustrates the replacable and upgradable Video Processor 202 (FIGS. 467*a* through 467*d*) of Communication Device 200. As described in the present drawing, Video Processor 202 is connected to Data Bus 203 via Video Processor Connector 202*a* and Video Processor Connector 202*b*. Video Processor Connector 202*a* is detachably connected to Video Processor Connector 202*b*. Therefore, Video Processor 202 can be replaced to a new one by disconnecting Video Processor Connector 202*a* from Video Processor Connector 202*b*.

FIG. 833*f* illustrates the replacable and upgradable Wireless Transmitter 222 (FIGS. 467*a* through 467*d*) of Communication Device 200. As described in the present drawing, Wireless Transmitter 222 is connected to Video Processor 202 via Wireless Transmitter Connector 222*a* and Wireless Transmitter Connector 222*b*. Wireless Transmitter Connector 222*a* is detachably connected to Wireless Transmitter Connector 222*b*. Therefore, Wireless Transmitter 222 can be replaced to a new one by disconnecting Wireless Transmitter Connector 222*a* from Wireless Transmitter Connector 222*b*.

FIG. 833*g* illustrates the replacable and upgradable Signal Processor 208 (FIGS. 467*a* through 467*d*) of Communication Device 200. As described in the present drawing, Signal Processor 208 is connected to Data Bus 203 via Signal Processor Connector 208*a* and Signal Processor Connector 208*b*. Signal Processor Connector 208*a* is detachably connected to Signal Processor Connector 208*b*. Therefore, Signal Processor 208 can be replaced to a new one by disconnecting Signal Processor Connector 208*a* from Signal Processor Connector 208*b*.

FIG. 833*h* illustrates the replacable and upgradable Antenna 218 (FIGS. 467*a* through 467*d*) of Communication Device 200. As described in the present drawing, Antenna 218 is connected to Signal Processor 208 via Antenna Connector 218*a* and Antenna Connector 218*b*. Antenna Connector 218*a* is detachably connected to Antenna Connector 218*b*. Therefore, Antenna 218 can be replaced to a new one by disconnecting Antenna Connector 218*a* from Antenna Connector 218*b*.

FIG. 833*i* illustrates the replacable and upgradable LED 219 (FIGS. 467*a* through 467*d*) of Communication Device 200. As described in the present drawing, LED 219 is connected to Data Bus 203 via LED Connector 219*a* and LED Connector 219*b*. LED Connector 219*a* is detachably connected to LED Connector 219*b*. Therefore, LED 219 can be replaced to a new one by disconnecting LED Connector 219*a* from LED Connector 219*b*.

FIG. 833*j* illustrates the replacable and upgradable Solar Panel 229 (FIGS. 467*a* through 467*d*) of Communication Device 200. As described in the present drawing, Solar Panel 229 is connected to Data Bus 203 via Solar Panel Connector 229*a* and Solar Panel Connector 229*b*. Solar Panel Connector 229*a* is detachably connected to Solar Panel Connector 229*b*. Therefore, Solar Panel 229 can be replaced to a new one by disconnecting Solar Panel Connector 229*a* from Solar Panel Connector 229*b*.

FIG. 833*k* illustrates the replacable and upgradable Battery 230 (FIGS. 467*a* through 467*d*) of Communication Device 200. As described in the present drawing, Battery 230 is connected to Data Bus 203 via Battery Connector 230*a* and Battery Connector 230*b*. Battery Connector 230*a* is detachably connected to Battery Connector 230*b*. Therefore, Battery 230 can be replaced to a new one by disconnecting Battery Connector 230*a* from Battery Connector 230*b*.

FIG. 833*l* illustrates the replacable and upgradable Flash Light Unit 220 (FIGS. 467*a* through 467*d*) of Communication Device 200. As described in the present drawing, Flash Light Unit 220 is connected to Data Bus 203 via Flash Light Unit Connector 220*a* and FlashLight Unit Connector 220*b*. Flash Light Unit Connector 220*a* is detachably connected to Flash Light Unit Connector 220*b*. Therefore, Flash Light Unit 220 can be replaced to a new one by disconnecting Flash Light Unit Connector 220*a* from Flash Light Unit Connector 220*b*.

FIG. 833*m* illustrates the replacable and upgradable Indicator 212 (FIGS. 467*a* through 467*d*) of Communication Device 200. As described in the present drawing, Indicator 212 is connected to Data Bus 203 via Indicator Connector 212*a* and Indicator Connector 212*b*. Indicator Connector 212*a* is detachably connected to Indicator Connector 212*b*. Therefore, Indicator 212 can be replaced to a new one by disconnecting Indicator Connector 212*a* from Indicator Connector 212*b*.

FIG. 833*n* illustrates the replacable and upgradable ROM 207 (FIGS. 467*a* through 467*d*) of Communication Device 200. As described in the present drawing, ROM 207 is connected to Data Bus 203 via ROM Connector 207*a* and ROM Connector 207*b*. ROM Connector 207*a* is detachably connected to ROM Connector 207*b*. Therefore, ROM 207 can be replaced to a new one by disconnecting ROM Connector 207*a* from ROM Connector 207*b*.

FIG. 833*o* illustrates the replacable and upgradable RAM 206 (FIGS. 467*a* through 467*d*) of Communication Device 200. As described in the present drawing, RAM 206 is connected to Data Bus 203 via RAM Connector 206*a* and RAM Connector 206*b*. RAM Connector 206*a* is detachably connected to RAM Connector 206*b*. Therefore, RAM 206 can be replaced to a new one by disconnecting RAM Connector 206*a* from RAM Connector 206*b*.

FIG. 833*p* illustrates the replacable and upgradable Sound Processor 205 (FIGS. 467*a* through 467*d*) of Communication Device 200. As described in the present drawing, Sound Processor 205 is connected to Data Bus 203 via Sound Processor Connector 205*a* and Sound Processor Connector 205*b*. Sound Processor Connector 205*a* is detachably connected to Sound Processor Connector 205*b*. Therefore, Sound Processor 205 can be replaced to a new one by disconnecting Sound Processor Connector 205*a* from Sound Processor Connector 205*b*.

FIG. 833*q* illustrates the replacable and upgradable Wireless Receiver 226 (FIGS. 467*a* through 467*d*) of Communication Device 200. As described in the present drawing, Wireless Receiver 226 is connected to Sound Processor 205 via Wireless Receiver Connector 226*a* and Wireless Receiver Connector 226*b*. Wireless Receiver Connector 226*a* is detachably connected to Wireless Receiver Connector 226*b*. Therefore, Wireless Receiver 226 can be replaced to a new one by disconnecting Wireless Receiver Connector 226*a* from Wireless Receiver Connector 226*b*.

FIG. 833*r* illustrates the replacable and upgradable Wireless Transmitter 223 (FIGS. 467*a* through 467*d*) of Communication Device 200. As described in the present drawing, Wireless Transmitter 223 is connected to Sound Processor 205 via Wireless Transmitter Connector 223*a* and Wireless Transmitter Connector 223*b*. Wireless Transmitter Connector 223*a* is detachably connected to Wireless Transmitter Connector 223*b*. Therefore, Wireless Transmitter 223 can be replaced to a new one by disconnecting Wireless Transmitter Connector 223*a* from Wireless Transmitter Connector 223*b*.

FIG. 833*s* illustrates the replacable and upgradable LCD 201L (FIGS. 467*a* through 467*d*) of Communication Device 200. As described in the present drawing, LCD 201L is connected to Wireless Receiver 224 via LCD Connector 201La and LCD Connector 201Lb. LCD Connector 201La is detachably connected to LCD Connector 201Lb. Therefore, LCD 201L can be replaced to a new one by disconnecting LCD Connector 201La from LCD Connector 201Lb.

FIG. 833*t* illustrates the replacable and upgradable LCD 201R (FIGS. 467*a* through 467*d*) of Communication Device 200. As described in the present drawing, LCD 201R is connected to Wireless Receiver 224 via LCD Connector 201Ra and LCD Connector 201Rb. LCD Connector 201Ra is detachably connected to LCD Connector 201Rb. Therefore, LCD 201R can be replaced to a new one by disconnecting LCD Connector 201Ra from LCD Connector 201Rb.

FIG. 833*u* illustrates the replacable and upgradable Speaker 216L (FIGS. 467*a* through 467*d*) of Communication Device 200. As described in the present drawing, Speaker 216L is connected to Wireless Receiver 225 via Speaker Connector 216La and Speaker Connector 216Lb. Speaker Connector 216La is detachably connected to Speaker Connector 216Lb. Therefore, Speaker 216L can be replaced to a new one by disconnecting Speaker Connector 216La from Speaker Connector 216Lb.

FIG. 833*v* illustrates the replacable and upgradable Speaker 216R (FIGS. 467*a* through 467*d*) of Communication Device 200. As described in the present drawing, Speaker 216R is connected to Wireless Receiver 225 via Speaker Connector 216Ra and Speaker Connector 216Rb. Speaker Connector 216Ra is detachably connected to Speaker Connector 216Rb. Therefore, Speaker 216R can be replaced to a new one by disconnecting Speaker Connector 216Ra from Speaker Connector 216Rb.

FIG. 833*w* illustrates the replacable and upgradable Microphone 215L (FIGS. 467*a* through 467*d*) of Communication Device 200. As described in the present drawing, Microphone 215L is connected to Wireless Transmitter 227 via Microphone Connector 215La and Microphone Connector 215Lb. Microphone Connector 215La is detachably connected to Microphone Connector 215Lb. Therefore, Microphone 215L can be replaced to a new one by disconnecting Microphone Connector 215La from Microphone Connector 215Lb.

FIG. 833*x* illustrates the replacable and upgradable Microphone 215R (FIGS. 467*a* through 467*d*) of Communication Device 200. As described in the present drawing, Microphone 215R is connected to Wireless Transmitter 227 via Microphone Connector 215Ra and Microphone Connector 215Rb. Microphone Connector 215Ra is detachably connected to Microphone Connector 215Rb. Therefore, Microphone 215R can be replaced to a new one by disconnecting Microphone Connector 215Ra from Microphone Connector 215Rb.

<<On Demand TV Function>>

FIGS. 834 through 855 illustrate the on demand TV function which enables Communication Device 200 to display a TV program on LCD 201 (FIG. 1) on the user's demand.

FIG. 834 illustrates the storage area included in Host Information Storage Area H00*a* (FIG. 429) of Host H (FIG. 429). As described in the present drawing, Host Information Storage Area H00*a* includes On Demand TV Information Storage Area H40*a* of which the data and the software programs stored therein are described in FIG. 835.

FIG. 835 illustrates the storage areas included in On Demand TV Information Storage Area H40*a*(FIG. 834). As described in the present drawing, On Demand TV Information Storage Area H40*a* includes On Demand TV Data Storage Area H40*b* and On Demand TV Software Storage Area H40*c*. On Demand TV Data Storage Area H40*b* stores the data necessary to implement the present function on the side of Host H (FIG. 429), such as the ones described in FIGS. 836 through 838. On Demand TV Software Storage Area H40*c* stores the software programs necessary to implement the present function on the side of Host H, such as the ones described in FIG. 839.

FIG. 836 illustrates the storage area included in On Demand TV Data Storage Area H40*b* (FIG. 835). As described in the present drawing, On Demand TV Data Storage Area H40*b* includes TV Program Data Storage Area H40*b*1 of which the data stored therein are described in FIGS. 837 and 838.

FIG. 837 illustrates the storage areas included in TV Program Data Storage Area H40*b*1 (FIG. 836). As described in the present drawing, TV Program Data Storage Area H40*b*1 comprises two columns, i.e., 'Channel ID' and 'TV Program Data'. The column 'Channel ID' stores the identifications of the channels available on Communication Device 200. The column 'TV Program Data' stores the TV program data of the corresponding channel ID. In the example described in the present drawing, TV Program Data Storage Area H40*b*1 stores 'Channel ID' H40ChID1 of which the 'TV Program Data' is H40TPD1; 'Channel ID' H40ChID2 of which the 'TV Program Data' is H40TPD2; 'Channel ID' H40ChID3 of which the 'TV Program Data' is H40TPD3; 'Channel ID' H40ChID4 of which the 'TV Program Data' is H40TPD4; and 'Channel ID' H40ChID5 of which the 'TV Program Data' is H40TPD5.

FIG. 838 illustrates the structure of TV program data stored in the column 'TV Program Data' of TV Program Data Storage Area H40*b*1 (FIG. 837). Taking TV Program Data H40TPD1 (FIG. 837) for example, the data comprises two types of data, i.e., the time data (which is described as 'Time (Min)' in the present drawing) and the TV program packet data (which is described as 'TV Program Packet Data' in the present drawing). TV Program Data H40TPD1, in the present example, is divided into ten TV program packet data, i.e., H40TPD1*a*, H40TPD1*b*, H40TPD1*c*, H40TPD1*d*, H40TPD1*e*, H40TPD1*f*, H40TPD1*g*, H40TPD1*h*, H40TPD1*i*, H40TPD1*j*, and H40TPD1*k* of which the corresponding time data are '0', '1', '2', '3', '4', '5', '6', '7', '8', '9', and '10', respectively. Each of time data '1' through '10' represents the time frame which the corresponding TV program data is displayed. Namely, TV program data H40TPD1*a* is displayed at time '0'. TV program data H40TPD1*b* is displayed at time '1'. TV program data H40TPD1*c* is displayed at time '2'. TV program data H40TPD1*d* is displayed at time '3'. TV program data H40TPD1*e* is displayed at time '4'. TV program data H40TPD1*f* is displayed at time '5'. TV program data H40TPD1*g* is displayed at time '6'. TV program data H40TPD1*h* is displayed at time '7'. TV program data H40TPD1*i* is displayed at time '8'. TV program data H40TPD1*j* is displayed at time '9'. TV program data H40TPD1*k* is displayed at time '10'. Therefore, TV Program Data H40TPD1 can be paused and resumed from any time frame by identifying the time data. All TV program data stored in TV Program Data Storage Area H40*b*1 (FIG. 837) are composed of a plurality of TV program packet data, and a time data is assigned to each TV program packet data as described in FIG. 838.

FIG. 839 illustrates the software programs stored in On Demand TV Software Storage Area H40*c*(FIG. 835). As described in the present drawing, On Demand TV Software Storage Area H40*c* stores TV Program Packet Data Sending Software H40*c*1, Timer Software H40*c*2, Current Time Identifying Software H40*c*3, Next Packet Data Sending Software H40*c*4, TV Program Pausing Software H40*c*5, TV Program Resume Software H40*c*6, and TV Program Initializing Software H40*c*7. TV Program Packet Data Sending Software H40*c*1 is the software program which is described in FIG. 848. Timer Software H40*c*2 is the software program which is described in FIG. 845. Current Time Identifying Software H40*c*3 is the software program which identifies the current time produced by Timer Software H40*c*2. Next Packet Data Sending Software H40*c*4 is the software program which is described in FIG. 852. TV Program Pausing Software H40*c*5 is the software program which is described in FIG. 853. TV Program Resume Software H40*c*6 is the software program which is described in FIG. 854. TV Program Initializing Software H40*c*7 is the software program which is described in FIG. 855.

FIG. 840 illustrates the storage area included in RAM 206 (FIG. 1) of Communication Device 200. As described in the present drawing, RAM 206 includes On Demand TV Information Storage Area 20640*a* of which the data and the software programs stored therein are described in FIG. 841.

The data and software programs stored in On Demand TV Information Storage Area 20640*a*(FIG. 840) are downloaded from Host H (FIG. 429) in the manner described in FIGS. 401 through 407.

FIG. 841 illustrates the storage areas included in On Demand TV Information Storage Area 20640*a* (FIG. 840). As described in the present drawing, On Demand TV Information Storage Area 20640*a* includes On Demand TV Data Storage Area 20640*b* and On Demand TV Software Storage Area 20640*c*. On Demand TV Data Storage Area 20640*b* stores the data necessary to implement the present function on the side of Communication Device 200, such as the ones described in FIGS. 842 and 843. On Demand TV Software Storage Area 20640*c* stores the software programs necessary to implement the present function on the side of Communication Device 200, such as the ones described in FIG. 844.

FIG. 842 illustrates the storage area included in On Demand TV Data Storage Area 20640*b* (FIG. 841). As described in the present drawing, On Demand TV Data Storage Area 20640*b* includes TV Program Data Storage Area 20640*b*1 of which the data stored therein are described in FIG. 843.

FIG. 843 illustrates the data stored in TV Program Data Storage Area 20640*b*1 (FIG. 842). As described in the present drawing, TV Program Data Storage Area 20640*b*1 comprises two columns, i.e., 'Channel ID' and 'TV Program Packet Data'. The column 'Channel ID' stores the identification of the channels available on Communication Device 200. The column 'TV Program Packet Data' stores the TV program packet data of the corresponding channel ID received from Host H (FIG. 429).

FIG. 844 illustrates the software program stored in On Demand TV Software Storage Area 20640*c* (FIG. 841). As described in the present drawing, On Demand TV Software Storage Area 20640*c* stores TV Program Initiating Software 20640*c*1, TV Program Packet Data Receiving Software 20640*c*2, TV Program Packet Data Displaying Software 20640*c*3, Next Packet Data Receiving Software 20640*c*4, TV Program Pausing Software 20640*c*5, TV Program Resume Software 20640*c*6, and TV Program Initializing Software 20640*c*7. TV Program Initiating Software 20640*c*1 is the software program which is described in FIG. 846. TV Program Packet Data Receiving Software 20640*c*2 is the software program which is described in FIG. 850. TV Program Packet Data Displaying Software 20640*c*3 is the software program which is described in FIG. 851. Next Packet Data Receiving Software 20640*c*4 is the software program which is described in FIG. 852. TV Program Pausing Software 20640*c*5 is the software program which is described in FIG. 853. TV Program Resume Software 20640*c*6 is the software program which is described in FIG. 854. TV Program Initializing Software 20640*c*7 is the software program which is described in FIG. 855.

FIG. 845 illustrates Timer Software H40*c*2 stored in On Demand TV Software Storage Area H40*c* (FIG. 839) of Host H (FIG. 429). As described in the present drawing, Host H, first of all, resets the time to '0' (S1). Host H administers the time, and everytime one minute has past (S2), the timer is incrimented by '1' until the time reaches the maximum number. Referring to TV Program Data H40TPD1 described in FIG. 838 for example, when the time is reset to '0', the TV program packet data H40TPD1*a* is ready to be retrieved from TV Program Data Storage Area H40*b*1 (FIG. 837). After one minute has passed, the timer is incrimented and the time is '1' at which the TV program packet data H40TPD1*b* is ready to be retrieved from TV Program Data Storage Area H40*b*1. When the timer is incrimented and the time is '2', the TV program packet data H40TPD1*c* is ready to be retrieved from TV Program Data Storage Area H40*b*1. In the same manner, when the timer is incrimented and the time is '3', the TV program packet data H40TPD1*d* is ready to be retrieved from TV Program Data Storage Area H40*b*1; when the timer is incrimented and the time is '4', the TV program packet data H40TPD1*e* is ready to be retrieved from TV Program Data Storage Area H40*b*1; when the timer is incrimented and the time is '5', the TV program packet data H40TPD1*f* is ready to be retrieved from TV Program Data Storage Area H40*b*1; when the timer is incrimented and the time is '6', the TV program packet data H40TPD1*g* is ready to be retrieved from TV Program Data Storage Area H40*b*1; when the timer is incrimented and the time is '7', the TV program packet data H40TPD1*h* is ready to be retrieved from TV Program Data Storage Area H40*b*1; when the timer is incrimented and the time is '8', the TV program packet data H40TPD1*i* is ready to be retrieved from TV Program Data Storage Area H40*b*1; when the timer is incrimented and the time is '9', the TV program packet data H40TPD1*j* is ready to be retrieved from TV Program Data Storage Area H40*b*1; when the timer is incrimented and the time is '10', the TV program packet data H40TPD1*k* is ready to be retrieved from TV Program Data Storage Area H40*b*1. The timer is no longer be incrimented thereafter since the time '10' is the maximum number for TV Program Data H40TPD1 (FIG. 838). The maximum number of each TV program data stored in TV Program Data Storage Area H40*b*1 (FIG. 837) may be different from the other TV program data stored therein.

FIG. 846 illustrates TV Program Initiating Software 20640*c*1 stored in On Demand TV Software Storage Area 20640*c* (FIG. 844) of Communication Device 200. As described in the present drawing, a certain channel ID is selected by utilizing Input Device 210 (FIG. 1) or via voice recognition system (S1). Next, CPU 211 (FIG. 1) sends TV Program Data Request 20640TPDR to Host H (FIG. 429) of which the data stored therein are described in FIG. 847 (S2).

FIG. 847 illustrates the data included in TV Program Data Request 20640TPDR described in S2 of FIG. 846. As described in the present drawing, TV Program Data Request 20640TPDR includes Request Signal 20640TPDR1 and Channel ID 20640TPDR2. Request Signal 20640TPDR1 is an indication to Host H to retrieve the TV program data therefrom corresponding to Channel ID 20640TPDR2, and Channel ID 20640TPDR2 is the channel ID selected in S1 of FIG. 846.

FIG. 848 illustrates TV Program Packet Data Sending Software H40*c*1 stored in On Demand TV Software Storage Area H40*c* (FIG. 839) of Host H (FIG. 429). As described in the present drawing, Host H, first of all, receives TV Program Data Request 20640TPDR (FIG. 847) (S1). Host H then retrieves Channel ID 20640TPDR2 (FIG. 847) therefrom (S2), and identifies the channel ID (S3). Host H identifies the current time of the TV program data of the corresponding channel ID by utilizing Current Time Identifying Software H40*c*3 (FIG. 839) (S4), and retrieves the corresponding TV program packet data from TV Program Data Storage Area H40*b*1 (FIG. 837) (S5). Host H sends to Communication Device 200 thereafter Requested TV Program Data H40RTPD of which the data stored therein are described in FIG. 849 (S6). Assuming that Channel ID 20640TPDR2 included in TV Program Data Request 20640TPDR represents 'Channel ID' H40ChID1 stored in TV Program Data Storage Area H40*b*1 (FIG. 837). Host H retrieves and identifies the 'Channel ID' as H40ChID1 in S2 and S3. Assuming that the TV program corresponding to 'Channel ID' H40ChID1 (FIG. 837) is already on-air for five minutes and is just about to start the sixth minute of the TV program. Host H identifies the current time (i.e., 'Time (Min)' in FIG. 838) as '5' in S4 by utilizing Current Time Identifying Software H40*c*3, and retrieves the corresponding 'TV Program Packet Data' H40TPD1*f* from TV Program Data Storage Area H40*b*1 in S5, which is sent to Communication Device 200 as Requested TV Program Data H40RTPD in S6.

FIG. 849 illustrates the data stored in Requested TV Program Data H40RTPD described in S6 or FIG. 848. As described in the present drawing, Requested TV Program Data H40RTPD comprises Response Signal H40RTPD1, Channel ID H40RTPD2, and TV Program Packet Data H40RTPD3. Response Signal H40RTPD1 indicates that Requested TV Program Data H40RTPD is a response to TV Program Data Request 20640TPDR described in FIG. 847. Channel ID H40RTPD2 represents 'Channel ID' H40ChID1 stored in TV Program Data Storage Area H40*b*1 (FIG. 837) in the present example. TV Program Packet Data H40RTPD3 represents 'TV Program Packet Data' H40TPD1*f* stored in TV Program Data Storage Area H40*b*1 in the present example.

FIG. 850 illustrates TV Program Packet Data Receiving Software 20640*c*2 stored in On Demand TV Software Storage Area 20640*c* (FIG. 844) of Communication Device 200. Referring to the present drawing, CPU 211 (FIG. 1) receives Requested TV Program Data H40RTPD (FIG. 849) sent by Host H (FIG. 429) in S6 of FIG. 848 (S1). CPU 211 then retrieves Channel ID H40RTPD2 and TV Program Packet Data H40RTPD3 from Requested TV Program Data H40RTPD (S2), and stores these data in TV Program Data Storage Area 20640*b*1 (FIG. 843) (S3). In the present example, 'Channel ID' H40ChID1 and 'TV Program Packet Data' H40TPD1*f* are retrieved in S2 and stored in TV Program Data Storage Area 20640*b*1 in S3.

FIG. 851 illustrates TV Program Packet Data Displaying Software 20640*c*3 stored in On Demand TV Software Storage Area 20640*c* (FIG. 844) of Communication Device 200. Referring to the present drawing, CPU 211 (FIG. 1) retrieves TV Program Packet Data H40RTPD3 from TV Program Data Storage Area 20640*b*1 (FIG. 843) (S1), and displays the data on LCD 201 (FIG. 1) of Communication Device 200 (S2). In the present example, 'TV Program Packet Data' H40TPD1*f* is retrieved in S1 and displayed on LCD 201 in S2.

FIG. 852 illustrates both Next Packet Data Sending Software H40*c*4 stored in On Demand TV Software Storage Area H40*c* (FIG. 839) of Host H (FIG. 429) and Next Packet Data Receiving Software 20640*c*4 stored in On Demand TV Software Storage Area 20640*c* (FIG. 844) of Communication Device 200. Referring to the present drawing, Host H (FIG. 429) retrieves the next TV program packet data from TV Program Data Storage Area H40*b*1 (FIG. 837) (S1), and sends the data to Communication Device 200 (S2). CPU 211 (FIG. 1) of Communication Device 200 receives the next TV program packet data (S3), and stores the data in TV Program Data Storage Area 20640*b*1 (FIG. 843) (S4), which is displayed on LCD 201 (FIG. 1) of Communication Device 200 thereafter. Here, the next TV program packet data is the data which is scheduled to be sent to and displayed on Communication Device 200. Referring to FIG. 838, H40TPD1*b* is the next TV program packet data if the TV program packet data H40TPD1*a* is already sent to and displayed on Communication Device 200, H40TPD1*c* is the next TV program packet data if the TV program packet data H40TPD1*b* is already sent to and displayed on Communication Device 200, H40TPD1*d* is the next TV program packet data if the TV program packet data H40TPD1*c* is already sent to and displayed on Communication Device 200, H40TPD1*e* is the next TV program packet data if the TV program packet data H40TPD1*d* is already sent to and displayed on Communication Device 200, H40TPD1*f* is the next TV program packet data if the TV program packet data H40TPD1*e* is already sent to and displayed on Communication Device 200, H40TPD1*g* is the next TV program packet data if the TV program packet data H40TPD1*f* is already sent to and displayed on Communication Device 200, H40TPD1*h* is the next TV program packet data if the TV program packet data H40TPD1*g* is already sent to and displayed on Communication Device 200, H40TPD1*i* is the next TV program packet data if the TV program packet data H40TPD1*h* is already sent to and displayed on Communication Device 200, H40TPD1*j* is the next TV program packet data if the TV program packet data H40TPD1*i* is already sent to and displayed on Communication Device 200, and H40TPD1*k* is the next TV program packet data if the TV program packet data H40TPD1*j* is already sent to and displayed on Communication Device 200.

FIG. 853 illustrates both TV Program Pausing Software 20640*c*5 stored in On Demand TV Software Storage Area 20640*c* (FIG. 844) of Communication Device 200 and TV Program Pausing Software H40*c*5 stored in On Demand TV Software Storage Area H40*c*(FIG. 839) of Host H (FIG. 429). Referring to the present drawing, a pause signal is input by utilizing Input Device 210 (FIG. 1) or via voice recognition system (S1). CPU 211 (FIG. 1) then displays the still image included in the TV program packet data on LCD 201 (FIG. 1) at the time the pause signal is input in S1 (S2). CPU 211 sends a pause request (S3) which is received by Host H (S4). Host H stops sending the next TV program packet data to Communication Device 200 thereafter (S5).

FIG. 854 illustrates both TV Program Resume Software 20640*c*6 stored in On Demand TV Software Storage Area 20640*c* (FIG. 844) of Communication Device 200 and TV Program Resume Software H40*c*6 stored in On Demand TV Software Storage Area H40*c*(FIG. 839) of Host H (FIG. 429). Referring to the present drawing, a resume signal is input by utilizing Input Device 210 (FIG. 1) or via voice recognition system (S1). CPU 211 (FIG. 1) then sends a resume request to Host H indicating to resume sending the next TV program packet data (S2). Upon receiving the resume request (S3), Host H resumes sending the next TV program packet data to Communication Device 200 (S4). The next TV program packet data of the next TV program packet data is sent thereafter, and the remaining TV program packet data are sent to and displayed on Communication Device 200 unless the pause signal described in S1 of FIG. 853 or any signal or the like is input to Communication Device 200.

FIG. 855 illustrates both TV Program Initializing Software 20640*c*7 stored in On Demand TV Software Storage Area 20640*c* (FIG. 844) of Communication Device 200 and TV Program Initializing Software H40*c*7 stored in On Demand TV Software Storage Area H40*c* (FIG. 839) of Host H (FIG. 429). Referring to the present drawing, an initializing signal is input by utilizing Input Device 210 (FIG. 1) or via voice recognition system (S1). CPU 211 (FIG. 1) then sends an initializing request to Host H indicating to start the TV program from the beginning (S2). Upon receiving the initializing request (S3), Host H initializes the timer of Timer Software H40*c*2 (FIG. 845) to '0', and thereby the first TV program packet data is ready to be sent to and displayed on Communication Device 200 (S4). In the present example, the timer of Timer Software H40*c*2 is initialized to '0', thereby 'TV Program Packet Data' H40TPD1*a* of TV Program Data H40TPD1 (FIG. 838) stored in TV Program Data Storage Area H40*b*1 (FIG. 837) is ready to be sent to and displayed on Communication Device 200. The first TV program packet data, 'TV Program Packet Data' H40TPD1*a* in the present example, is sent to Communication Device 200 (S5). FIG. 852 applies hereafter until the pause signal described in FIG. 853 or any signal of the like is input to Communication Device 200.

<<On Demand TV Function—Summary>>

(1) An on demand TV system comprising a host computer and a communication device wherein said host computer stores a TV program, said communication device requests for said TV program, said TV program is sent to said communication device and displayed on a display of said communication device, said TV program is paused when a pause signal is input via said input device.

(2) A communication device comprising a microphone, a speaker, a display, an input device and a multiple mode implementor, wherein said multiple mode implementor implements a voice communication mode and an on demand TV mode, a series of audio data are input to and output from said microphone and said speaker respectively when said voice communication mode is implemented, a TV program is displayed on said display and said TV program is paused when a pause signal is input via said input device when said on demand TV mode is implemented.

(3) An on demand TV software program which displays a TV program on a display of a communication device wherein said TV program is paused under the control of said on demand TV software program when a pause signal is input via said input device.

(4) Said TV program in summary (1), (2), or (3) is resumed from the point said TV program is paused when a resume signal is input via said input device.

(5) Said TV program in summary (1), (2), or (3) is replayed from the beginning of said TV program when an initiation signal is input via said input device.

<<Inter-Communicating TV Function>>

FIGS. 856 through 882 illustrate the inter-communicating TV function which enables Communication Device 200 to send an answer data to Host H (FIG. 429) at which the answer data from a plurality of communication devices including Communication Device 200 are counted and the counting data as described in FIG. 856 is produced.

FIG. 856 illustrates the counting data produced by Host H (FIG. 429) based on the answer data received from a plurality of communication devices including Communication Device 200. As described in the present drawing, Question TVS41*a* and Counting Data TVS41*b* are shown on TV Screen TVS41 which are broadcasted by TV stations. TV Screen TVS41 is the screen displayed on a television owned by each household in the United States. Question TVS41*a* is the question displayed on TV Screen TVS41 asked to the viewer of a specific TV program. Counting Data TVS41*b* is the counting data of the answers to Question TVS41*a* sent from the views including the users of Communication Device 200 by utilizing the present function. In the present example, Question TVS41*a* is 'Are you older than 30?' and Counting Data TVS41*b* is 'Yes: 80%; No: 20%'.

FIG. 857 illustrates the storage area included in Host Information Storage Area H00*a* (FIG. 429) of Host H (FIG. 429). As described in the present drawing, Host Information Storage Area H00*a* includes Inter-communicating TV Information Storage Area H41*a* of which the data and the software program stored therein are described in FIG. 858.

FIG. 858 illustrates the storage areas included in Inter-communicating TV Information Storage Area H41*a*(FIG. 857). As described in the present drawing, Inter-communicating TV Information Storage Area H41*a* includes Inter-communicating TV Data Storage Area H41*b* and Inter-communicating TV Software Storage Area H41*c*. Inter-communicating TV Data Storage Area H41*b* stores the data necessary to implement the present function on the side of Host H (FIG. 429), such as the ones described in FIGS. 859 through 862. Inter-communicating TV Software Storage Area H41*c* stores the software programs necessary to implement the present function on the side of Host H, such as the ones described in FIG. 863.

FIG. 859 illustrates the storage areas included in Inter-communicating TV Data Storage Area H41*b* (FIG. 858). As described in the present drawing, Inter-communicating TV Data Storage Area H41*b* includes Answer Data Storage Area H41*b*1, Question Data Storage Area H41*b*2, Counting Data Storage Area H41*b*3, and User ID Storage Area H41*b*4. Answer Data Storage Area H41*b*1 stores the data described in FIG. 860. Question Data Storage Area H41*b*2 stores the data described in FIG. 861. Counting Data Storage Area H41*b*3 stores the data described in FIG. 862. User ID Storage Area H41*b*4 stores the data described in FIG. 859*a*.

FIG. 859*a* illustrates the data stored in User ID Storage Area H41*b*4 (FIG. 859). As described in the present drawing, User ID Storage Area H41*b*4 stores the identifications of each user of Communication Device 200. In the present example, User ID Storage Area H41*b*4 stores the following user IDs: ID#1, ID#2, ID#3, ID#4, and ID#5.

FIG. 860 illustrates the data stored in Answer Data Storage Area H41*b*1 (FIG. 859). As described in the present drawing, Answer Data Storage Area H41*b*1 comprises two columns, i.e., 'User ID' and 'Answer Data'. The column 'User ID' stores the identifications of each user of Communication Device 200 which are identical to the ones stored in User ID Storage Area H41*b*4 (FIG. 859*a*). The column 'Answer Data' stores the answer data sent from the user of Communication Device 200 of the corresponding user ID. In the present example, Answer Data Storage Area H41*b*1 stores the following data: 'User ID' ID#1 of which the corresponding 'Answer Data' which the user of Communication Device 200 sent is 'Yes'; 'User ID' ID#2 of which the corresponding 'Answer Data' which the user of Communication Device 200 sent is 'Yes'; 'User ID' ID#3 of which the corresponding 'Answer Data' which the user of Communication Device 200 sent is 'Yes'; 'User ID' ID#4 of which the corresponding 'Answer Data' which the user of Communication Device 200 sent is 'Yes'; and 'User ID' ID#5 of which the corresponding 'Answer Data' which the user of Communication Device 200 sent is 'No'.

FIG. 861 illustrates the data stored in Answer Data Storage Area H41*b*1 (FIG. 859). As described in the present drawing, Answer Data Storage Area H41*b*1 comprises two columns, i.e., 'Question ID' and 'Question Data'. The column 'Question ID' stores the identifications of the question data, and the column 'Question Data' stores the question data corresponding to the question ID. In the present example, Question Data Storage Area H41*b*2 stores the following data: 'Question ID' Q#1 of which the corresponding question data is 'Are you older than 30?'; 'Question ID' Q#2 of which the corresponding question data is 'Do you support the President?'; and 'Question ID' Q#3 of which the corresponding question data is 'Do you own more than 2 cars?'

FIG. 862 illustrates the data stored in Counting Data Storage Area H41*b*3 (FIG. 859). As described in the present drawing, Counting Data Storage Area H41*b*3 comprises two columns, i.e., 'Choice Data' and 'Sub-total Data'. The column 'Choice Data' stores the choices from which the users of Communication Devices 200 can select to answer Question TVS41*a*(FIG. 856) displayed on TV Screen TVS41 (FIG. 856). The column 'Sub-total Data' stores the sub-total of the counting data of each 'Choice Data'. In the present example, Counting Data Storage Area H41*b*3 stores the following data: The 'Choice Data' 'Yes' of which the 'Sub-total Data' is '4'; and the 'Choice Data' 'No' of which the 'Sub-total Data' is '1'.

FIG. 863 illustrates software programs stored in Inter-communicating TV Software Storage Area H41*c* (FIG. 858). As described in the present drawing, Inter-communicating TV Software Storage Area H41*c* stores Question Data Sending Software H41*c*1, Answer Data Receiving Software H41*c*2, Answer Data Counting Software H41*c*3, Counting Data Broadcasting Software H41*c*4, and Counting Data Sending Software H41*c*5. Question Data Sending Software H41*c*1 is the software program described in FIG. 871. Answer Data Receiving Software H41*c*2 is the software program described in FIG. 877. Answer Data Counting Software H41*c*3 is the software program described in FIG. 878. Counting Data Broadcasting Software H41*c*4 is the software program described in FIG. 879. Counting Data Sending Software H41*c*5 is the software program described in FIG. 880.

FIG. 864 illustrates the storage area included in RAM 206 (FIG. 1) of Communication Device 200. As described in the present drawing, RAM 206 includes Inter-communicating TV Information Storage Area 20641*a* of which the data and the software program stored therein are described in FIG. 865.

The data and software programs stored in Inter-communicating TV Information Storage Area 20641*a*(FIG. 864) are downloaded from Host H (FIG. 429) in the manner described in FIGS. 401 through 407.

FIG. 865 illustrates the storage areas includes in Inter-communicating TV Information Storage Area 20641*a* (FIG. 864). As described in the present drawing, Inter-communicating TV Information Storage Area 20641*a* includes Inter-communicating TV Data Storage Area 20641*b* and Inter-communicating TV Software Storage Area 20641*c*. Inter-communicating TV Data Storage Area 20641*b* stores the data necessary to implement the present function on the side of Communication Device 200, such as the ones described in FIGS. 866 through 869. Inter-communicating TV Software Storage Area 20641*c* stores the software programs necessary to implement the present function on the side of Communication Device 200, such as the ones described in FIG. 870.

FIG. 866 illustrates the storage areas included in Inter-communicating TV Data Storage Area 20641*b* (FIG. 865). As described in the present drawing, Inter-communicating TV Data Storage Area 20641*b* includes Question Data Storage Area 20641*b*1, Answer Data Storage Area 20641*b*2, and Counting Data Storage Area 20641*b*3. Question Data Storage Area 20641*b*1 stores data described in FIG. 867. Answer Data Storage Area 20641*b*2 stores data described in FIG. 868. Counting Data Storage Area 20641*b*3 stores data described in FIG. 869.

FIG. 867 illustrates the data stored in Question Data Storage Area 20641*b*1 (FIG. 866). As described in the present drawing, Question Data Storage Area 20641*b*1 comprises two columns, i.e., 'Question ID' and 'Question Data'. The column 'Question ID' stores the identification of the question data sent from Host H (FIG. 429) as described hereinafter, and the column 'Question Data' stores the question data corresponding to the question ID which is also sent from Host H as described hereinafter. In the present example, Question Data Storage Area 20641*b*1 stores the following data: 'Question ID' Q#1 of which the corresponding question data is 'Are you older than 30?'

FIG. 868 illustrates the data stored in Answer Data Storage Area 20641*b*3 (FIG. 866). As described in the present drawing, Answer Data Storage Area 20641*b*3 comprises two columns, i.e., 'Question ID' and 'Answer Data'. The column 'Question ID' stores the identification of the question data sent from Host H (FIG. 429). The column 'Answer Data' stores the answer data input by the user of Communication Device 200. In the present example, Answer Data Storage Area 20641*b*3 stores the following data: 'Question ID' 'Q#1' of which the 'Answer Data' is 'Yes'.

FIG. 869 illustrates the data stored in Counting Data Storage Area 20641*b*3 (FIG. 866). As described in the present drawing, Counting Data Storage Area 20641*b*3 comprises two columns, i.e., 'Choice Data' and 'Sub-total Data'. The column 'Choice Data' stores the choices from which the users of Communication Devices 200 can select to answer Question TVS41*a*(FIG. 856) displayed on TV Screen TVS41 (FIG. 856). The column 'Sub-total Data' stores the sub-total of the counting data of each 'Choice Data'. In the present example, Counting Data Storage Area 20641*b*3 stores the following data: The 'Choice Data' 'Yes' of which the 'Sub-total Data' is '4'; and the 'Choice Data' 'No' of which the 'Sub-total Data' is '1'. Primarily, the data stored in Counting Data Storage Area 20641*b*3 are identical to the ones stored in Counting Data Storage Area H41*b*3 (FIG. 862) of Host H (FIG. 429).

FIG. 870 illustrates the software programs stored in Inter-communicating TV Software Storage Area 20641*cf* (FIG. 865). As described in the present drawing, Inter-communicating TV Software Storage Area 20641*c* stores Question Data Receiving Software 20641*c*1, Question Data Displaying Software 20641*c*2, Answer Data Inputting Software 20641*c*3, Answer Data Sending Software 20641*c*4, Counting Data Receiving Software 20641*c*5, Counting Data Displaying Software 20641*c*6, and Key Allocating Software 20641*c*7. Question Data Receiving Software 20641*c*1 is the software program described in FIG. 872. Question Data Displaying Software 20641*c*2 is the software program described in FIG. 873. Answer Data Inputting Software 20641*c*3 is the software program described in FIG. 874. Answer Data Sending Software 20641*c*4 is the software program described in FIG. 875. Counting Data Receiving Software 20641*c*5 is the software program described in FIG. 881. Counting Data Displaying Software 20641*c*6 is the software program described in FIG. 882. Key Allocating Software 20641*c*7 is the software program described in FIG. 875.

FIG. 871 illustrates Question Data Sending Software H41*c*1 stored in Inter-communicating TV Software Storage Area H41*c* (FIG. 863) of Host H (FIG. 429) which sends the question data to Communication Device 200. Referring to the present drawing, the operator of Host H selects the question ID (S1). Host H retrieves the question data (including the question ID thereof) from Question Data Storage Area H41*b*2 (FIG. 861) (S2), and further retrieves the user IDs from User ID Storage Area H41*b*4 (FIG. 859*a*) (S3). Host H sends the question data (including the question ID thereof) to Communication Devices 200 of the user IDs retrieved in S3 (S4).

FIG. 872 illustrates Question Data Receiving Software 20641*c*1 stored in Inter-communicating TV Software Storage Area 20641*c* (FIG. 870) of Communication Device 200 which receives the question data from Host H (FIG. 429). Referring to the present drawing, CPU 211 (FIG. 1) receives the question data (including the question ID thereof) sent from Host H as described in S4 of FIG. 871 (S1). The question data (including the question ID thereof) is stored in Question Data Storage Area 20641*b*1 (FIG. 867) (S2).

FIG. 873 illustrates Question Data Displaying Software 20641*c*2 stored in Inter-communicating TV Software Storage Area 20641*c* (FIG. 870) of Communication Device 200 which displays the question data on LCD 201 (FIG. 1). Referring to the present drawing, CPU 211 (FIG. 1) retrieves the question data from Question Data Storage Area 20641*b*1 (FIG. 867) (S1), and displays the data on LCD 201 (S2).

FIG. 874 illustrates Answer Data Inputting Software 20641*c*3 stored in Inter-communicating TV Software Storage Area 20641*c* (FIG. 870) of Communication Device 200 to input the answer data. First of all, CPU 211 (FIG. 1) allocates the keys by Key Allocating Software 20641*c*7 (FIG. 875) (S1). The user of Communication Device 200 then inputs the answer data by utilizing Input Device 210 (FIG. 1) or via voice recognition system (S2), which is stored in Answer Data Storage Area 20641*b*3 (FIG. 868) (S3).

FIG. 875 illustrates Key Allocating Software 20641*c*7 stored in Inter-communicating TV Software Storage Area 20641*c* (FIG. 870) of Communication Device 200 to utilize the keys described in FIG. 647 to input the answer data. Referring to the present drawing, CPU 211 (FIG. 1) allocate key '1' (FIG. 647) as 'Yes' (S1), and allocate key '2' as 'No' (S2).

FIG. 876 illustrates Answer Data Sending Software 20641*c*4 stored in Inter-communicating TV Software Storage Area 20641*c* (FIG. 870) of Communication Device 200 which sends the answer data to Host H (FIG. 429). Referring to the present drawing, CPU 211 (FIG. 1) retrieves the answer data from Answer Data Storage Area 20641*b*3 (FIG. 868) (S1), and sends the data to Host H (S2).

FIG. 877 illustrates Answer Data Receiving Software H41*c*2 stored in Inter-communicating TV Software Storage Area H41*c* (FIG. 863) of Host H (FIG. 429) which receives the answer data sent from Communication Device 200.

Referring to the present drawing, Host H (FIG. 429) receives the answer data sent from Communication Device 200 as described in S2 of FIG. 876 (S1), and stores the answer data to Answer Data Storage Area H41b1 (FIG. 860) at the corresponding user ID (S2).

FIG. 878 illustrates Answer Data Counting Software H41c3 stored in Inter-communicating TV Software Storage Area H41c (FIG. 863) of Host H (FIG. 429) which counts the answer data sent from a plurality of devices. Referring to the present drawing, Host H (FIG. 429) counts the answer data stored in Answer Data Storage Area H41b1 (FIG. 860) (S1), and stores the result (the counting data) in Counting Data Storage Area H41b3 (FIG. 862) (S2).

FIG. 879 illustrates Counting Data Broadcasting Software H41c4 stored in Inter-communicating TV Software Storage Area H41c (FIG. 863) of Host H (FIG. 429) which broadcasts the counting data produced in S1 of FIG. 878. Referring to the present drawing, Host H (FIG. 429) retrieves the counting data from Counting Data Storage Area H41b3 (FIG. 862) (S1) and the question data from Question Data Storage Area H41b2 (FIG. 861) (S2). The question data and the counting data are broadcasted thereafter (S3), and Question TVS41a and Counting Data TVS41b are displayed on TV Screen TVS41 as described in FIG. 856.

FIG. 880 illustrates Counting Data Sending Software H41c5 stored in Inter-communicating TV Software Storage Area H41c (FIG. 863) of Host H (FIG. 429) which sends the counting data to Communication Device 200. Referring to the present drawing, Host H retrieves the counting data from Counting Data Storage Area H41b3 (FIG. 862) (S1), and sends the data to Communication Device 200 (S2).

FIG. 881 illustrates Counting Data Receiving Software 20641c5 stored in Inter-communicating TV Software Storage Area 20641c (FIG. 870) of Communication Device 200 which receives the counting data sent from Host H (FIG. 429). Referring to the present drawing, CPU 211 (FIG. 1) receives the counting data from Host H(S1), and stores the data in Counting Data Storage Area 20641b3 (FIG. 869) (S2).

FIG. 882 illustrates Counting Data Displaying Software 20641c6 stored in Inter-communicating TV Software Storage Area 20641c (FIG. 870) of Communication Device 200 which stores the counting data. Referring to the present drawing, CPU 211 (FIG. 1) retrieves the counting data from Counting Data Storage Area 20641b3 (FIG. 869) (S1), and displays the data on LCD 201 (FIG. 1) (S2).

<<Inter-Communicating TV Function—Summary>>

(1) An inter-communicating system comprising a host computer and a communication device wherein said host computer sends a question data to said communication device, said communication device displays said question data on a display of said communication device, said communication device is input an answer data which is sent to said host computer, and said host computer counts a plurality of answer data received from a plurality of devices including said communication device from which said host computer produces a counting data.

(2) A communication device comprising a microphone, a speaker, a display, an input device and a multiple mode implementor, wherein said multiple mode implementor implements a voice communication mode and an inter-communicating mode, a series of audio data are input to and output from said microphone and said speaker respectively when said voice communication mode is implemented, a question data is displayed on said display and an answer data is input via said input device when said inter-communicating mode is implemented.

(3) An inter-communicating software program designed to be installed into a communication device wherein a question data is displayed on a display of said communication device and an answer data is input via an input device of said communication device under the control of said inter-communicating software program.

<<Display Controlling Function>>

FIGS. 883 through 894 illustrate the display controlling function which enables Communication Device 200 to control the brightness and/or the contrast of LCD 201 (FIG. 1) per file opened or software program executed. In other words, the user of Communication Device 200 can set the brightness and/or the contrast of LCD 201 (FIG. 1) unique to each file or software program. For example, the user can set the brightness as the first brightness value and the contrast as the second contrast value for a certain MS Word document, and set the brightness as the second brightness value and the contrast as the third contrast value for a certain shooting video game.

FIG. 883 illustrates the storage area included in RAM 206 (FIG. 1). As described in the present drawing, RAM 206 includes Display Controlling Information Storage Area 20642a of which the data and software programs stored therein are described in FIG. 884.

The data and software programs stored in Display Controlling Information Storage Area 20642a (FIG. 883) are downloaded from Host H (FIG. 429) in the manner described in FIGS. 401 through 407.

FIG. 884 illustrates the storage areas included in Display Controlling Information Storage Area 20642a (FIG. 883). As described in the present drawing, Display Controlling Information Storage Area 20642a includes Display Controlling Data Storage Area 20642b and Display Controlling Software Storage Area 20642c. Display Controlling Data Storage Area 20642b stores the data necessary to implement the present function, such as the ones described in FIG. 885. Display Controlling Software Storage Area 20642c stores the software programs necessary to implement the present function, such as the ones described in FIG. 886.

FIG. 885 illustrates the data stored in Display Controlling Data Storage Area 20642b (FIG. 884). As described in the present drawing, Display Controlling Data Storage Area 20642b comprises two columns, i.e., 'File/Software ID' and 'Display Controlling Data', and column 'Display Controlling Data' further comprises columns 'Brightness Value' and 'Contrast Value'. Column 'File/Software ID' stores the identifications of the files and the software programs wherein the brightness value and the contrast value of each file and software program is uniquely set by utilizing the present function. Column 'Brightness Value' stores the brightness value unique to each file or software program. Column 'Contrast Value' stores the contrast value unique to each file or software program. In the example described in the present drawing, Display Controlling Data Storage Area 20642b stores the following data: 'File/Software ID' File #1 of which the 'Brightness Value' is '20642BV1' and the 'Contrast Value' is '20642CV1'; 'File/Software ID' File #2 of which the 'Brightness Value' is '20642BV2' and the 'Contrast Value' is '20642CV2'; 'File/Software ID' File #3 of which the 'Brightness Value' is 20642BV1 and the 'Contrast Value' is '20642CV3'; 'File/Software ID' Software #1 of which the 'Brightness Value' is '20642BV2' and the 'Contrast Value' is '20642CV1'; and 'File/Software ID' Software #2 of which the 'Brightness Value' is '20642BV3' and the 'Contrast Value' is '20642CV2'. Here, the brightness value '20642BV1', '20642BV2', and '20642BV3' may be of any value, such as 'high', 'medium', and 'low' respectively, or '80%', '85%', and '90%', respectively. The contrast value '20642CV1', '20642CV2', and '20642CV3' may be of any value, such as 'high', 'medium', and 'low' respectively, or '80%', '85%', and '90%', respectively.

FIG. 886 illustrates the software programs stored in Display Controlling Software Storage Area 20642*c* (FIG. 884). As described in the present drawing, Display Controlling Software Storage Area 20642*c* stores File/Software Executing Software 20642*c*1, Brightness Controlling Software 20642*c*2, Contrast Controlling Software 20642*c*3, Default Brightness Value Executing Software 20642*c*4, Default Contrast Value Executing Software 20642*c*5, Brightness/Contrast Setting Software 20642*c*6, Brightness Manually Adjusting Software 20642*c*7, and Contrast Manually Adjusting Software 20642*c*8. File/Software Executing Software 20642*c*1 is the software program described in FIG. 887. Brightness Controlling Software 20642*c*2 is the software program described in FIG. 888. Contrast Controlling Software 20642*c*3 is the software program described in FIG. 889. Default Brightness Value Executing Software 20642*c*4 is the software program described in FIG. 890. Default Contrast Value Executing Software 20642*c*5 is the software program described in FIG. 891. Brightness/Contrast Setting Software 20642*c*6 is the software program described in FIG. 892. Brightness Manually Adjusting Software 20642*c*7 is the software program described in FIG. 893. Contrast Manually Adjusting Software 20642*c*8 is the software program described in FIG. 894.

FIG. 887 illustrates File/Software Executing Software 20642*c*1 stored in Display Controlling Software Storage Area 20642*c* (FIG. 886) which opens the file or executes the software program selected by the user of Communication Device 200. Referring to the present drawing, a file or a software program is selected by utilizing Input Device 210 (FIG. 1) or via voice recognition system (S1). CPU 211 (FIG. 1) then opens the file or executes the software program (S2).

FIG. 888 illustrates Brightness Controlling Software 20642*c*2 stored in Display Controlling Software Storage Area 20642*c* (FIG. 886) to control the brightness of LCD 201 (FIG. 1) per file opened or per software program executed. Referring to the present drawing, CPU 211 (FIG. 1) identifies the file or the software program selected in S1 of FIG. 887 (S1), and retrieves the brightness value from column 'Brightness Value' of Display Controlling Data Storage Area 20642*b* (FIG. 885) if the file or the software program identified in S1 is registered and found in column 'File/Software ID' of Display Controlling Data Storage Area 20642*b* (S2). CPU 211 controls the brightness of LCD 201 in accordance with the brightness value retrieved in S2 (S3).

FIG. 889 illustrates Contrast Controlling Software 20642*c*3 stored in Display Controlling Software Storage Area 20642*c* (FIG. 886) to control the contrast of LCD 201 (FIG. 1) per file opened or per software program executed. Referring to the present drawing, CPU 211 (FIG. 1) identifies the file or the software program selected in S1 of FIG. 887 (S1), and retrieves the contrast value from column 'Contrast Value' of Display Controlling Data Storage Area 20642*b* (FIG. 885) if the file or the software program identified in S1 is registered and found in column 'File/Software ID' of Display Controlling Data Storage Area 20642*b* (S2). CPU 211 controls the contrast of LCD 201 in accordance with the contrast value retrieved in S2 (S3).

FIG. 890 illustrates Default Brightness Value Executing Software 20642*c*4 stored in Display Controlling Software Storage Area 20642*c* (FIG. 886) which controls the brightness of LCD 201 (FIG. 1) if the file or the software program which is to be opened or executed is not listed in Display Controlling Data Storage Area 20642*b* (FIG. 885). If the file opened or the software program executed is not found in column 'File/Software ID' of Display Controlling Data Storage Area 20642*b* (FIG. 885), CPU 211 (FIG. 1) sets the brightness value as '20642BV2' which is the default brightness value (S1). CPU 211 then controls the brightness of LCD 201 (FIG. 1) in accordance with the default brightness value '20642BV2' (S2).

FIG. 891 illustrates Default Contrast Value Executing Software 20642*c*5 stored in Display Controlling Software Storage Area 20642*c* (FIG. 886) which controls the contrast of LCD 201 (FIG. 1) if the file or the software program which is to be opened or executed is not listed in Display Controlling Data Storage Area 20642*b* (FIG. 885). If the file opened or the software program executed is not found in column 'File/Software ID' of Display Controlling Data Storage Area 20642*b* (FIG. 885), CPU 211 (FIG. 1) sets the contrast value as '20642CV2' which is the default contrast value (S1). CPU 211 then controls the contrast of LCD 201 (FIG. 1) in accordance with the default contrast value '20642CV2' (S2).

FIG. 892 illustrates Brightness/Contrast Setting Software 20642*c*6 stored in Display Controlling Software Storage Area 20642*c* (FIG. 886) which enables the user of Communication Device 200 to set the brightness value and/or the contrast value of each file and software program. Referring to the present drawing, CPU 211 (FIG. 1) displays a list of files and/or software programs stored in Communication Device 200 (S1). A certain file or software program is selected by utilizing Input Device 210 (FIG. 1) or via voice recognition system (S2). When the selected file is opened or the selected software program is executed (S3), the brightness value and the contrast value are set by utilizing Input Device 210 (FIG. 1) or via voice recognition system (S4 and S5). The values set in S4 and S5 are stored in Display Controlling Data Storage Area 20642*b* (FIG. 885) as well as the identification thereof (S6).

FIG. 893 illustrates Brightness Manually Adjusting Software 20642*c*7 stored in Display Controlling Software Storage Area 20642*c* (FIG. 886) which enables the user of Communication Device 200 to manually set the brightness value regardless of the file opened or the software program executed. Referring to the present drawing, the brightness value is selected by utilizing Input Device 210 (FIG. 1) or via voice recognition system (S1). CPU 211 controls the brightness of LCD 201 (FIG. 1) in accordance with the contrast value selected in S1 (S2).

FIG. 894 illustrates Contrast Manually Adjusting Software 20642*c*8 stored in Display Controlling Software Storage Area 20642*c* (FIG. 886) which enables the user of Communication Device 200 to manually set the contrast value regardless of the file opened or the software program executed. Referring to the present drawing, the contrast value is selected by utilizing Input Device 210 (FIG. 1) or via voice recognition system (S1). CPU 211 controls the contrast of LCD 201 (FIG. 1) in accordance with the contrast value selected in S1 (S2).

<<Display Controlling Function—Summary>>

(1) A communication device comprising a microphone, a speaker, a display, an input device and a multiple mode implementor, wherein said multiple mode implementor implements a voice communication mode and a display controlling mode, a series of audio data are input to and output from said microphone and said speaker respectively when said voice communication mode is implemented, the brightness and/or the contrast of said display is controlled per the file opened or the software program executed when said display controlling mode is implemented.

(2) A display controlling software program which controls the brightness and/or the contrast of a display of a communication device depending on the file opened or the software program executed.

<<Multiple Party Communicating Function>>

FIGS. 894*a* through 917 illustrate the multiple party communicating function which enables the user of Communication Device 200 to communicate with more than one person via Communication Device 200 by utilizing the present function.

FIG. 894*a* illustrates the storage area included in RAM 206 (FIG. 1). As described in the present drawing, RAM 206 includes Multiple Party Communicating Information Storage Area 20643*a* of which the data and the software programs stored therein are described in FIG. 895.

The data and software programs stored in Multiple Party Communicating Information Storage Area 20643*a* (FIG. 894*a*) are downloaded from Host H (FIG. 429) in the manner described in FIGS. 401 through 407.

FIG. 895 illustrates the storage areas included in Multiple Party Communicating Information Storage Area 20643*a* (FIG. 894*a*). As described in the present drawing, Multiple Party Communicating Information Storage Area 20643*a* includes Multiple Party Communicating Data Storage Area 20643*b* and Multiple Party Communicating Software Storage Area 20643*c*. Multiple Party Communicating Data Storage Area 20643*b* stores the data necessary to implement the present function, such as the ones described in FIGS. 897 through 899. Multiple Party Communicating Software Storage Area 20643*c* stores the software programs necessary to implement the present function, such as the ones described in FIG. 900.

FIG. 896 illustrates the storage areas included in Multiple Party Communicating Data Storage Area 20643*b* (FIG. 895). As described in the present drawing, Multiple Party Communicating Data Storage Area 20643*b* includes Parties Data Storage Area 20643*b*1, Selected Parties Data Storage Area 20643*b*2, and Voice Data Storage Area 20643*b*3. Parties Data Storage Area 20643*b*1 stores data described in FIG. 897. Selected Parties Data Storage Area 20643*b*2 stores data described in FIG. 898. Voice Data Storage Area 20643*b*3 stores data described in FIG. 899.

FIG. 897 illustrates the data stored in Parties Data Storage Area 20643*b*1 (FIG. 896). As described in the present drawing, Parties Data Storage Area 20643*b*1 comprises three columns, i.e., 'User ID', 'Name', and 'Phone Number'. Column 'User ID' stores the identifications of the persons who may be friends, family members, relatives, and/or colleagues of the user of Communication Device 200. Column 'Name' stores the name of the person of the corresponding 'User ID'. Column 'Phone Number' stores the phone number of the person of the corresponding 'User ID'. In the present example described in the present drawing, Parties Data Storage Area 20643*b*1 stores the following data: 'User ID' User #1 of which the corresponding 'Name' and 'Phone Number' are 'John Doe' and '916-455-1293', respectively; 'User ID' User #2 of which the corresponding 'Name' and 'Phone Number' are 'Jane Doe' and '408-222-3653', respectively; and 'User ID' User #3 of which the corresponding 'Name' and 'Phone Number' are 'Peter Pan' and '418-313-9587', respectively. 'User ID' User #1 is the identification of the user of Communication Device 200.

FIG. 898 illustrates the data stored in Selected Parties Data Storage Area 20643*b*2 (FIG. 896). As described in the present drawing, Selected Parties Data Storage Area 20643*b*2 stores the user IDs 'User #1', 'User #2', and 'User #3'. These user IDs represent the identifications of the parties who participate in the multiple party communication by utilizing the present function. In the present example described in the present drawing, the names of the parties who participate in the multiple party communication are John Doe, Jane Doe, and Peter Pan by referring to FIG. 897.

FIG. 899 illustrates the storage areas included in Voice Data Storage Area 20643*b*3 (FIG. 896). As described in the present drawing, Voice Data Storage Area 20643*b*3 includes 1st Voice Data Storage Area 20643*b*3*a*, 2nd Voice Data Storage Area 20643*b*3*b*, and 3rd Voice Data Storage Area 20643*b*3*c*. 1st Voice Data Storage Area 20643*b*3*a* stores the voice data generated in S1 of FIG. 903. 2nd Voice Data Storage Area 20643*b*3*b* stores the voice data received in S1 of FIG. 904. 3rd Voice Data Storage Area 20643*b*3*c* stores the voice data received in S1 of FIG. 905.

FIG. 900 illustrates the software programs stored in Multiple Party Communicating Software Storage Area 20643*c* (FIG. 895). As described in the present drawing, Multiple Party Communicating Software Storage Area 20643*c* includes Calling Party Selecting Software 20643*c*1, Dialing Software 20643*c*2, 1st Voice Data Processing Software 20643*c*3, 2nd Voice Data Processing Software 20643*c*4, and 3rd Voice Data Processing Software 20643*c*5. Calling Party Selecting Software 20643*c*1 is the software program described in FIG. 901. Dialing Software 20643*c*2 is the software program described in FIG. 902. 1st Voice Data Processing Software 20643*c*3 is the software program described in FIG. 903. 2nd Voice Data Processing Software 20643*c*4 is the software program described in FIG. 904. 3rd Voice Data Processing Software 20643*c*5 is the software program described in FIG. 905.

Assume hereinafter that the user of Communication Device 200 ('John Doe') initiates a multiple party communication with his friends, Jane Doe and Peter Pan, by utilizing the present function. Communication Device 200 owned by John Doe is referred to as "Device A", the device owned by Jane Doe is referred to as "Device B", and the device owned by Peter Pan is referred to as "Device C" hereinafter.

FIG. 901 illustrates Calling Party Selecting Software 20643*c*1 stored in Multiple Party Communicating Software Storage Area 20643*c* (FIG. 900) of Device A which selects the parties participating in the multiple party communication by utilizing the present function. Referring to the present drawing, CPU 211 (FIG. 1) displays a list of names and phone numbers as well as the user ID stored in Parties Data Storage Area 20643*b*1 (FIG. 897) (S1). The parties who participate in the multiple party communication are selected by utilizing Input Device 210 (FIG. 1) or via voice recognition system (S2). CPU 211 stores the user IDs of the selected parties in Selected Parties Data Storage Area 20643*b*2 (FIG. 898) (S3). In the present example, the list of 'User ID' User #1 of which the corresponding 'Name' and 'Phone Number' are 'John Doe' and '916-455-1293', respectively; 'User ID' User #2 of which the corresponding 'Name' and 'Phone Number' are 'Jane Doe' and '408-222-3653', respectively; and 'User ID' User #3 of which the corresponding 'Name' and 'Phone Number' are 'Peter Pan' and '418-313-9587', respectively is displayed on LCD 201 in S1. 'Jane Doe' and 'Peter Pan' are selected in S2. 'John Doe', the user of Communication Device 200, is automatically selected by default. The user IDs of 'John Doe', 'Jane Doe', and 'Peter Pan', i.e., user IDs User #1, User #2, and User #3, are stored in Selected Parties Data Storage Area 20643*b*2 as described in FIG. 898.

FIG. 902 illustrates Dialing Software 20643*c*2 stored in Multiple Party Communicating Software Storage Area 20643*c* (FIG. 900) of Device A which initiates the dialing process to the parties participating in the multiple party communication. Referring to the present drawing, CPU 211 (FIG. 1) retrieves the phone numbers of the selected parties from Parties Data Storage Area **20643*b*1 (FIG. 897) by referring to the user IDs (excluding its own user ID) stored in Selected Parties Data Storage Area 20643*b*2 (FIG. 898) (S1), and initiates the dialing process to each phone number (S2). The line is connected thereafter (S3). In the present example, CPU 211, by referring to the user IDs User #2 and User #3 (User #1 excluded) stored in Selected Parties Data Storage Area 20643*b*2, retrieves the phone numbers '408-222-3653' and '418-313-9587' in S1, and initiates the dialing process to each phone number in S2**. The line is connected thereafter.

FIG. 903 illustrates 1st Voice Data Processing Software **20643*c*3 stored in Multiple Party Communicating Software Storage Area 20643*c* (FIG. 900) of Device A which processes the voice data of the first party participating in the multiple party communication ('John Doe', the user of Communication Device 200 in the present example). Referring to the present drawing, the 1st voice data is input to Device A via Microphone 215 (FIG. 1) (S1). Here, the 1st voice data is the voice data of Jon Doe. CPU 211 (FIG. 1) stores the 1st voice data in 1st Voice Data Storage Area 20643*b*3*a* (FIG. 899) (S2). CPU 211 next retrieves the 1st voice data from 1st Voice Data Storage Area 20643*b*3*a* and sends the data to Device B (S3). CPU 211 again retrieves the 1st voice data from 1st Voice Data Storage Area 20643*b*3*a* and sends the data to Device C (S4**).

FIG. 904 illustrates 2nd Voice Data Processing Software **20643*c*4 stored in Multiple Party Communicating Software Storage Area 20643*c* (FIG. 900) of Device A which processes the voice data of the second party participating in the multiple party communication ('Jane Doe' in the present example). Referring to the present drawing, CPU 211 (FIG. 1) receives the 2nd voice data from Device B (S1). Here the 2nd voice data is the voice data sent from Device B. CPU 211 (FIG. 1) stores the 2nd voice data in 2nd Voice Data Storage Area 20643*b*3*b* (FIG. 899) (S2). CPU 211 next retrieves the 2nd voice data from 2nd Voice Data Storage Area 20643*b*3*b* and outputs the data from Speaker 216 (FIG. 1) (S3). CPU 211 again retrieves the 2nd voice data from 2nd Voice Data Storage Area 20643*b*3*b* and sends the data to Device C (S4**).

FIG. 905 illustrates 3rd Voice Data Processing Software **20643*c*5 stored in Multiple Party Communicating Software Storage Area 20643*c* (FIG. 900) of Device A which processes the voice data of the third party participating in the multiple party communication ('Peter Pan' in the present example). Referring to the present drawing, CPU 211 (FIG. 1) receives the 3rd voice data from Device C (S1). Here the 3rd voice data is the voice data sent from Device C. CPU 211 (FIG. 1) stores the 3rd voice data in 3rd Voice Data Storage Area 20643*b*3*c* (FIG. 899) (S2). CPU 211 next retrieves the 3rd voice data from 3rd Voice Data Storage Area 20643*b*3*c* and outputs the data from Speaker 216 (FIG. 1) (S3). CPU 211 again retrieves the 3rd voice data from 3rd Voice Data Storage Area 20643*b*3*c* and sends the data to Device B (S4**).

<<Multiple Party Communicating Function—Another Embodiment>>

FIGS. 906 through 971 illustrate another embodiment of the present function utilizing Host H (FIG. 429).

FIG. 906 illustrates the storage area included in Host Information Storage Area H**00*a* of Host H (FIG. 429). As described in the present drawing, Host Information Storage Area H00*a* includes Multiple Party Communicating Information Storage Area H43*a* of which the data and the software programs stored therein are described in FIG. 907**.

FIG. 907 illustrates the storage areas included in Multiple Party Communicating Information Storage Area H**43*a* (FIG. 906). As described in the present drawing, Multiple Party Communicating Information Storage Area H43*a* includes Multiple Party Communicating Data Storage Area H43*b* and Multiple Party Communicating Software Storage Area H43*c*. Multiple Party Communicating Data Storage Area H43*b* stores the data necessary to implement the present function on the side of Host H, such as the ones described in FIGS. 908 through 911. Multiple Party Communicating Software Storage Area H43*c* stores the software programs necessary to implement the present function on the side of Host H, such as the ones described in FIG. 912**.

FIG. 908 illustrates the storage areas included in Multiple Party Communicating Data Storage Area H**43*b* (FIG. 907). As described in the present drawing, Multiple Party Communicating Data Storage Area H43*b* includes Parties Data Storage Area H43*b*1, Selected Parties Data Storage Area H43*b*2, and Voice Data Storage Area H43*b*3. Parties Data Storage Area H43*b*1 stores the data described in FIG. 909. Selected Parties Data Storage Area H43*b*2 stores the data described in FIG. 910. Voice Data Storage Area H43*b*3 stores the data described in FIG. 911**.

FIG. 909 illustrates the data stored in Parties Data Storage Area H**43*b*1 (FIG. 908). As described in the present drawing, Parties Data Storage Area H43*b*1 comprises three columns, i.e., 'User ID', 'Name', and 'Phone Number'. Column 'User ID' stores the identifications of the persons who may be friends, family members, relatives, and/or colleagues of the user of Communication Device 200. Column 'Name' stores the name of the person of the corresponding 'User ID'. Column 'Phone Number' stores the phone number of the person of the corresponding 'User ID'. In the present example described in the present drawing, Parties Data Storage Area H43*b*1 stores the following data: 'User ID' User #1 of which the corresponding 'Name' and 'Phone Number' are 'John Doe' and '916-455-1293', respectively; 'User ID' User #2 of which the corresponding 'Name' and 'Phone Number' are 'Jane Doe' and '408-222-3653', respectively; and 'User ID' User #3 of which the corresponding 'Name' and 'Phone Number' are 'Peter Pan' and '418-313-9587', respectively. 'User ID' User #1 is the identification of the user of Communication Device 200**.

FIG. 910 illustrates the data stored in Selected Parties Data Storage Area H**43*b*2 (FIG. 908). As described in the present drawing, Selected Parties Data Storage Area H43*b*2 stores the user IDs 'User #1', 'User #2', and 'User #3'. These user IDs represent the identifications of the parties who participate in the multiple party communication by utilizing the present function. In the present example described in the present drawing, the names of the parties who participate in the multiple party communication are John Doe, Jane Doe, and Peter Pan by referring to FIG. 909**.

FIG. 911 illustrates the storage areas included in Voice Data Storage Area H**43*b*3 (FIG. 908). As described in the present drawing, Voice Data Storage Area H43*b*3 includes 1st Voice Data Storage Area H43*b*3*a*, 2nd Voice Data Storage Area H43*b*3*b*, and 3rd Voice Data Storage Area H43*b*3*c*. 1st Voice Data Storage Area H43*b*3*a* stores the voice data generated in S1 of FIG. 915. 2nd Voice Data Storage Area H43*b*3*b* stores the voice data received in S1 of FIG. 916. 3rd Voice Data Storage Area H43*b*3*c* stores the voice data received in S1 of FIG. 917**.

FIG. 912 illustrates the software programs stored in Multiple Party Communicating Software Storage Area H**43*c* (FIG. 907). As described in the present drawing, Multiple Party Communicating Software Storage Area H43*c* includes Calling Party Selecting Software H43*c*1, Dialing Software H43*c*2, 1st Voice Data Processing Software H43*c*3, 2nd Voice Data Processing Software H43$c$4, and 3rd Voice Data Processing Software H43$c$5. Calling Party Selecting Software H43$c$1 is the software program described in FIG. 913. Dialing Software H43$c$2 is the software program described in FIG. 914. 1st Voice Data Processing Software H43$c$3 is the software program described in FIG. 915. 2nd Voice Data Processing Software H43$c$4 is the software program described in FIG. 916. 3rd Voice Data Processing Software H43$c$5 is the software program described in FIG. 917**.

FIG. 913 illustrates both Calling Party Selecting Software 20643$c$1 stored in Multiple Party Communicating Software Storage Area 20643$c$ (FIG. 900) of Communication Device 200 and Calling Party Selecting Software H43$c$1 stored in Multiple Party Communicating Software Storage Area H43$c$ (FIG. 912) of Host H (FIG. 429) which select the parties participating in the multiple party communication by utilizing the present function. Referring to the present drawing, CPU 211 (FIG. 1) of Communication Device 200 requests for the names and the phone numbers as well as the user IDs registered in Host H (S1). Host H (FIG. 429), in response, retrieves the names and the phone numbers (as well as the user IDs) from Parties Data Storage Area H43$b$1 (FIG. 909) (S2), and sends them to Communication Device 200 (S3). Upon receiving the names and the phone numbers (as well as the user IDs) from Host H (S4), CPU 211 stores them in Parties Data Storage Area 20643$b$1 (FIG. 897) (S5). CPU 211 then retrieves the names and the phone numbers (as well as the user IDs) from Parties Data Storage Area 20643$b$1 and displays a list of the names and the phone numbers (as well as the user IDs) on LCD 201 (FIG. 1) (S6). The parties participating in the multiple party communication are selected by utilizing Input Device 210 (FIG. 1) or via voice recognition system (S7). CPU 211 stores the user IDs of the selected parties in Selected Parties Data Storage Area 20643$b$2 (FIG. 898) (S8). CPU 211 then retrieves and sends the user IDs of the selected parties to Host H (S9). Host H receives the user IDs and stores them in Selected Parties Data Storage Area H43$b$2 (FIG. 910) (S10). In the present example, the list of 'User ID' User #1 of which the corresponding 'Name' and 'Phone Number' are 'John Doe' and '916-455-1293', respectively; 'User ID' User #2 of which the corresponding 'Name' and 'Phone Number' are 'Jane Doe' and '408-222-3653', respectively; and 'User ID' User #3 of which the corresponding 'Name' and 'Phone Number' are 'Peter Pan' and '418-313-9587', respectively is retrieved in S2 and received by Communication Device 200 in S4, and further displayed on LCD 201 in S6. 'Jane Doe' and 'Peter Pan' are selected in S7. 'John Doe', the user of Communication Device 200, is automatically selected by default. The user IDs of 'John Doe', 'Jane Doe', and 'Peter Pan', i.e., user IDs User #1, User #2, and User #3 are stored in Selected Parties Data Storage Area 20643$b$2 as described in S8, which are sent to Host H and stored in Selected Parties Data Storage Area H43$b$2 in S10.

FIG. 914 illustrates Dialing Software H43$c$2 stored in Multiple Party Communicating Software Storage Area H43$c$ (FIG. 912) of Host H (FIG. 429) which initiates the dialing process to the parties participating in the multiple party communication. Referring to the present drawing, Host H (FIG. 429) retrieves the phone numbers of the selected parties from Parties Data Storage Area H43$b$1 (FIG. 909) by referring to the user IDs stored in Selected Parties Data Storage Area H43$b$2 (FIG. 910) (S1), and initiates the dialing process to each phone number (S2). The line is connected thereafter (S3). In the present example, Host H by referring to the user IDs User #1, User #2, and User #3 stored in Selected Parties Data Storage Area H43$b$2, retrieves the phone numbers '916-455-1293', '408-222-3653', and '418-313-9587' in S1, and initiates the dialing process to each phone number in S2. The line is connected thereafter.

FIG. 915 illustrates both 1st Voice Data Processing Software 20643$c$3 stored in Multiple Party Communicating Software Storage Area 20643$c$ (FIG. 900) of Communication Device 200 and 1st Voice Data Processing Software H43$c$3 stored in Multiple Party Communicating Software Storage Area H43$c$ (FIG. 912) of Host H (FIG. 429) which process the voice data of the first party participating in the multiple party communication ('John Doe', the user of Communication Device 200 in the present example). Referring to the present drawing, the 1st voice data is input to Device A via Microphone 215 (FIG. 1) (S1). Here, the 1st voice data is the voice data of Jone Doe. CPU 211 (FIG. 1) stores the 1st voice data in 1st Voice Data Storage Area 20643$b$3$a$ (FIG. 899) (S2). CPU 211 next retrieves the 1st voice data from 1st Voice Data Storage Area 20643$b$3$a$ and sends the data to Host H (S3). Host H receives the 1st voice data (S4), and stores the data in 1st Voice Data Storage Area H43$b$3$a$ (FIG. 911) (S5). Host H then retrieves the 1st voice data from 1st Voice Data Storage Area H43$b$3$a$ (S6), and sends the data to Device B and Device C (S7). Both Device B and Device C receive and store the 1st voice data in their memories (S8), which are retrieved and output from their speakers thereafter (S9).

FIG. 916 illustrates both 2nd Voice Data Processing Software 20643$c$4 stored in Multiple Party Communicating Software Storage Area 20643$c$ (FIG. 900) of Communication Device 200 and 2nd Voice Data Processing Software H43$c$4 stored in Multiple Party Communicating Software Storage Area H43$c$ (FIG. 912) of Host H (FIG. 429) which process the voice data of the second party participating in the multiple party communication ('Jane Doe' in the present example). Referring to the present drawing, Host H receives the 2nd voice data from Device B (S1). Here the 2nd voice data is the voice data sent from Device B. Host H stores the 2nd voice data in 2nd Voice Data Storage Area H43$b$3$b$ (FIG. 911) (S2). Host H next retrieves the 2nd voice data from 2nd Voice Data Storage Area H43$b$3$b$ (S3), and sends the data to Device A and Device C (S4). Both Device A and Device C receive and store the 2nd voice data in their memories (S5), which are retrieved and output from their speakers thereafter (S6).

FIG. 917 illustrates both 3rd Voice Data Processing Software 20643$c$5 stored in Multiple Party Communicating Software Storage Area 20643$c$ (FIG. 900) of Communication Device 200 and 3rd Voice Data Processing Software H43$c$5 stored in Multiple Party Communicating Software Storage Area H43$c$ (FIG. 912) of Host H (FIG. 429) which process the voice data of the third party participating in the multiple party communication ('Peter Pan' in the present example). Referring to the present drawing, Host H receives the 3rd voice data from Device C (S1). Here the 3rd voice data is the voice data sent from Device C. Host H stores the 3rd voice data in 3rd Voice Data Storage Area H43$b$3$c$ (FIG. 911) (S2). Host H next retrieves the 3rd voice data from 3rd Voice Data Storage Area H43$b$3$c$ (S3), and sends the data to Device A and Device B (S4). Both Device A and Device B receive and store the 3rd voice data in their memories (S5), which are retrieved and output from their speakers thereafter (S6).

<<Multiple Party Communicating Function—Summary>>

(1) A multiple party communicating system comprising a host computer, a communication device, wherein a list of counter communication devices are displayed on a display of a communication device, more than one counter communication devices are selected from said list via an input device of said communication device, an input audio data is input via a microphone of said communication device which is sent to more than one counter communication devices via said host computer, and the audio data sent from said more than one counter communication devices via said host computer are output from a speaker of said communication device under the control of said multiple party communicating software program.

(2) A communication device comprising a microphone, a speaker, a display, an input device and a multiple mode implementor, wherein said multiple mode implementor implements a two-party communication mode and a multiple party communicating mode, an input audio data is input via said microphone which is sent to one counter communication device and the audio data sent from said counter communication device is output from said speaker thereby enabling two-party communication when said two-party communication mode is implemented, said input audio data is input via said microphone which is sent to more than one counter communication devices and the audio data sent from said more than one counter communication devices are output from said speaker thereby enabling multiple party communication when said multiple party communication mode is implemented.

(3) A multiple party communicating software program wherein a list of counter communication devices are displayed on a display of a communication device, more than one counter communication devices are selected from said list via an input device of said communication device, an input audio data is input via a microphone of said communication device which is sent to more than one counter communication devices, and the audio data sent from said more than one counter communication devices are output from a speaker of said communication device under the control of said multiple party communicating software program.

<<Display Brightness Controlling Function>>

FIGS. 918 through 923 illustrate the display brightness controlling function which controls the brightness of LCD 201 (FIG. 1) in accordance with the brightness detected by Photometer 232 (FIG. 467*a*) of the surrounding area of the user of Communication Device 200.

FIG. 918 illustrates the storage areas included in RAM 206 (FIG. 1). As described in the present drawing, RAM 206 includes Display Brightness Controlling Info Storage Area 20644*a* of which the data and the software programs stored therein are described in FIG. 919.

FIG. 919 illustrates the storage areas included in Display Brightness Controlling Info Storage Area 20644*a* (FIG. 918). As described in the present drawing, Display Brightness Controlling Info Storage Area 20644*a* includes Display Brightness Controlling Data Storage Area 20644*b* and Display Brightness Controlling Software Storage Area 20644*c*. Display Brightness Controlling Data Storage Area 20644*b* stores the data necessary to implement the present function, such as the one described in FIG. 920. Display Brightness Controlling Software Storage Area 20644*c* stores the software programs necessary to implement the present function, such as the ones described in FIG. 921.

FIG. 920 illustrates the data stored in Display Brightness Controlling Data Storage Area 20644*b* (FIG. 919). As described in the present drawing, Display Brightness Controlling Data Storage Area 20644*b* comprises two columns, i.e., 'Photometer Value' and 'Brightness Value'. 'Photometer Value' represents the value of the brightness detected by Photometer 232 (FIG. 467*a*). 'Brightness Value' represents the value of the brightness of LCD 201 (FIG. 1). In the present example described in the present drawing, the brightness value is '3' when the photometer value is '1'; the brightness value is '2' when the photometer value is '2'; and the brightness value is '1' when the photometer value is '3'.

FIG. 921 illustrates the software programs stored in Display Brightness Controlling Software Storage Area 20644*c* (FIG. 919). As described in the present drawing, Display Brightness Controlling Software Storage Area 20644*c* stores Brightness Controlling Software 20644*c*1 and Brightness Manually Adjusting Software 20642*c*2. Brightness Controlling Software 20644*c*1 is the software program described in FIG. 922. Brightness Manually Adjusting Software 20642*c*2 is the software program described in FIG. 923.

FIG. 922 illustrates Brightness Controlling Software 20644*c*1 stored in Display Brightness Controlling Software Storage Area 20644*c* (FIG. 921) which automatically controls the brightness of LCD 201 (FIG. 1). Referring to the present drawing, CPU 211 (FIG. 1) determines the photometer value detected by Photometer 232 (FIG. 467*a*) (S1). CPU 211 then refers to Display Brightness Controlling Data Storage Area 20644*b* (FIG. 920) and retrieves the corresponding brightness value therefrom (S2), and controls the brightness of LCD 201 (S3). For example, assuming that CPU 211 determines that the photometer value detected by Photometer 232 in S1 is '1'. Then CPU 211 refers to Display Brightness Controlling Data Storage Area 20644*b* (FIG. 920) and retrieves the corresponding brightness value '3' therefrom in S2, and controls the brightness of LCD 201 accordingly in S3.

FIG. 923 illustrates Brightness Manually Adjusting Software 20642*c*2 stored in Display Brightness Controlling Software Storage Area 20644*c* (FIG. 921) which enables the user of Communication Device 200 to manually adjust the brightness of LCD 201 (FIG. 1). Referring to the present drawing, CPU 211 (FIG. 1) displays on LCD 201 (FIG. 1) the selectable brightness values by retrieving the data from the column 'Brightness Value' of Display Brightness Controlling Data Storage Area 20644*b* (FIG. 920) (S1). One of the brightness value is selected by utilizing Input Device 210 (FIG. 1) or via voice recognition system (S2), and CPU 211 controls the brightness of LCD 201 accordingly (S3).

<<Display Brightness Controlling Function—Summary>>

A mobile communication device comprising a display, a photometer, an antenna, and a multiple mode implementor wherein said multiple mode implementor implements a communication mode and a display brightness controlling mode, said mobile communication device sends and receives a series of data via said antenna when said mobile communication device is in said communication mode, and the brightness of said display is controlled in accordance with the light received by said photometer when said mobile communication device is in said display controlling mode.

<<Multiple Party Pin-Pointing Function>>

FIGS. 924 through 950*f* illustrate the multiple party pin-pointing function of the positioning system which enables Communication Device 200 to display the accurate locations of the wireless communication devices (including itself) in an artificial structure, such as a non-movable structure (e.g., building and house) and a movable structure (e.g., train, airplane, space shuttle, and space station). FIGS. 20*a* through 26 apply to implement the multiple party pin-pointing function. An example of Device A displaying the locations of Devices A, B, and C is utilized hereinafter wherein Devices A, B, and C are Communication Devices 200.

FIG. 924 illustrates the building in which Devices A, B, and C are located. Referring to FIG. 924, Building 45BLD is composed of Basement 45BSM1 (the basement), Floor 45FLR1 (the first floor), Floor 45FLR2 (the second floor), and Floor 45FLR3 (the third floor).

FIG. 925 illustrates the relays installed in each room of Building 45BLD (FIG. 924). Referring to FIG. 925, each Room 45RM of Building 45BLD is installed of a plurality of relays which are utilized for detecting the locations of Devices A, B, and C by the method so-called 'GPS' as described in FIGS. 20*a* through 26. In the present example, four relays, i.e., R51 through R54 are installed in Room 45RM in the manner described in FIG. 925.

FIG. 926 illustrates the relays installed in each corridor of Building 45BLD (FIG. 924). Referring to FIG. 926, each Corridor 45CRD of Building 45BLD is installed of a plurality of relays which are utilized for detecting the locations of Devices A, B, and C by the method so-called 'GPS' as described in FIGS. 20*a* through 26. In the present example, nine relays, i.e., R55 through R63 are installed in Corridor 45CRD in the manner described in FIG. 926.

Referring to FIG. 927, the user of Device A selects the display type by utilizing Input Device 210 (FIG. 1) or via voice recognition system. Here, the display type available in the present embodiment are the display type #1 (which displays the area map with the indication of the locations of Devices A, B, and C therein as described in FIG. 928), the display type #2 (which displays the building and each floor with the indication of the locations of Devices A, B, and C therein as described in FIG. 929), and the display type #3 (which displays the room and the indication of the locations of Devices A, B, and C therein as described in FIG. 930). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

FIG. 928 illustrates the method to display an area map describing the area where Devices A, B, and C are located. As described in FIG. 928, Area Map Display Area 20145AMD in which an area map is shown with the locations of Devices A, B, and C is displayed on LCD 201 (FIG. 1) when a specific key of Input Device 210 is pressed as described in S1 of FIG. 927.

FIG. 929 illustrates the method to display the building and the floor where Devices A, B, and C are located. As described in FIG. 929, Building 45BLD and each floor thereof (e.g., Basement 45BSM1, Floor 45FLR1, Floor 45FLR2, and Floor 45FLR3 in FIG. 924) are displayed on LCD 201 (FIG. 1) when a specific key of Input Device 210 is pressed in the manner described in S2 of FIG. 927. LCD 201 indicates that Devices A, B, and C are located on Floor 45FLR2 (the second floor) of Building 45BLD in the example described in FIG. 929.

FIG. 930 illustrates the method to display the room where Devices A, B, and C are located. As described in FIG. 930, Room 45RM is displayed on LCD 201 (FIG. 1) when a specific key of Input Device 210 (FIG. 1) is pressed in the manner described in S3 of FIG. 927. LCD 201 indicates that Devices A, B, and C are located in Room 45RM and the location therein as described in FIG. 930.

FIGS. 931 through 936 illustrates an embodiment of pinpointing the locations of Devices A, B, and C in a train.

Referring to FIG. 931, Train 45TRN is composed of four cars, i.e., Car 45CR1 (the first car), Car 45CR2 (the second car), Car 45CR3 (the third car), and Car 45CR4 (the fourth car).

FIG. 932 illustrates the relays installed in each car of Train 45TRN (FIG. 931). Taking Car 45CR1 for example, Car 45CR1 is installed of a plurality of relays which are utilized for detecting the existence and the precise location of Communication Device 200 therein by utilizing the method so-called 'GPS' as described in FIGS. 20*a* through 26. In the present example, six relays, i.e., R71 through R76 are installed in Car 45CR1 in the manner described in FIG. 932.

Referring to FIG. 933, the user of Device A selects the display type by utilizing Input Device 210 (FIG. 1) or via voice recognition system in the manner described in FIG. 933. Here, the display type available in the present embodiment are the display type #1 (which displays the area map with the indication of the locations of Devices A, B, and C therein as described in FIG. 934), the display type #2 (which displays the main structure of Train 45TRN (FIG. 931) with the indication of the locations of Devices A, B, and C therein as described in FIG. 935), and the display type #3 (which displays the car and the indication of the locations of Devices A, B, and C therein as described in FIG. 936). In one embodiment, the display type #1 is selected when a specific key of Input Device 210 is pressed once (S1), the display type #2 is selected when the specific key of Input Device 210 is pressed again (S2), and the display type #3 is selected when the specific key of Input Device 210 is pressed for one more time (S3).

FIG. 934 illustrates the method to display an area map describing the area where Devices A, B, and C are located. As described in FIG. 934, Area Map Display Area 20145AMD in which an area map is shown is displayed on LCD 201 (FIG. 1) when a specific key of Input Device 210 is pressed as described in S1 of FIG. 933.

FIG. 935 illustrates the method to display the train and the car where Devices A, B, and C are located. As described in FIG. 935, Train 45TRN and each care thereof (e.g., Car 45CR1, Car 45CR2, Car 45CR3, and Car 45CR4) are displayed on LCD 201 (FIG. 1) when a specific key of Input Device 210 is pressed in the manner described in S2 of FIG. 933. LCD 201 indicates that Devices A, B, and C are located in Car 45CR1 (the first car) of Train 45TRN in the example described in FIG. 935.

FIG. 936 illustrates the method to display the car where Devices A, B, and C are located. Assuming that Devices A, B, and C are located in Car 45CR1. As described in FIG. 936, Car 45CR1 is displayed on LCD 201 (FIG. 1) when a specific key of Input Device 210 (FIG. 1) is pressed in the manner described in S3 of FIG. 933. LCD 201 indicates that Devices A, B, and C are located in Car 45CR1 and the location therein as described in FIG. 936.

FIG. 937 illustrates the information stored in Host Information Storage Area H00*a* (FIG. 429). As described in FIG. 937, Host Information Storage Area H00*a* includes GPS Information Storage Area H45*a* of which the details are described in FIG. 938.

FIG. 938 illustrates the storage areas included in GPS Information Storage Area H45*a* (FIG. 937). As described in FIG. 938, GPS Information Storage Area H45*a* includes GPS Software Storage Area H45*b* and GPS Data Storage Area H45*c*. GPS Software Storage Area H45*b* stores the software programs necessary to implement the present function on the side of Host H (FIG. 429), such as the one described in FIG. 940. GPS Data Storage Area H45*c* stores the data necessary to implement the present function on the side of Host H, such as the one described in FIG. 939.

FIG. 939 illustrates the storage areas included in GPS Data Storage Area H45*c* (FIG. 938). As described in FIG. 939, GPS Data Storage Area H45*c* includes Communication Device Location Data Storage Area H45*c*1, Map Data Storage Area H45*c*2, 3D Map Data Storage Area H45*c*3, Character Data Storage Area H45*c*4, and Relay Location Data Storage Area H45*c*5. Communication Device Location Data Storage Area H45*c*1 stores the location data of Devices A, B, and C. Map Data Storage Area H45*c*2 stores a plurality of map data which are designed to be sent to Device A. 3D Map Data Storage Area H45*c*3 stores a plurality of three-dimensional version of map data corresponding to the map data stored in Map Data Storage Area H45*c*2. Character Data Storage Area H45*c*4 stores various types of character data designed to be displayed on LCD 201 (FIG. 1) of Device A. Relay Location Data Storage Area H45*c*5 stores the location data of the relays and relating data thereto as described in FIG. 939*a* hereinafter.

FIG. 939*a* illustrates the data stored in Relay Location Data Storage Area H45*c*5 (FIG. 939). Referring to FIG. 939*a*, Relay Location Data Storage Area H45*c*5 stores a plurality of the Relay ID, the Location Data and the Reference Data. The column Relay ID stores identifications assigned to each relay. The column Location Data stores location data in x, y, z format of each relay utilized for calculating the locations of Devices A, B, and C by the GPS system of which the details are explained in FIGS. 20*a* through 26. The column Reference Data stores the identification of each building, floor number, and the room identification in which the relays are installed. Assume that Building 45BLD (FIG. 924) is assigned as 'Building #5', Floor 45FLR3 (FIG. 924) is assigned as 'Floor #3', Room 45RM (FIG. 925) is assigned as 'Room #1', and Corridor 45CRD (FIG. 926) is assigned as 'Corridor #1'. Taking the data described in FIG. 939*a* for example, the Location Data of Relay ID R51 is x51,y51,z51 and its Reference Data is Building #5,Floor #3,Room #1 which means that relay R51 is installed in Room #1 located on Floor #3 of Building #5. In the same manner, the Location Data of Relay ID R52 is x52,y52,z52 and its Reference Data is Building #5,Floor #3,Room #1 which means that relay R52 is installed in Room #1 located on Floor #3 of Building #5; the Location Data of Relay ID R53 is x53,y53,z53 and its Reference Data is Building #5,Floor #3,Room #1 which means that relay R53 is installed in Room #1 located on Floor #3 of Building #5; the Location Data of Relay ID R54 is x54,y54, z54 and its Reference Data is Building #5,Floor #3,Room #1 which means that relay R54 is installed in Room #1 located on Floor #3 of Building #5; the Location Data of Relay ID R55 is x55,y55,z55 and its Reference Data is Building #5,Floor #3,Corridor #1 which means that relay R55 is installed in Corridor #1 located on Floor #3 of Building #5; the Location Data of Relay ID R56 is x56,y56,z56 and its Reference Data is Building #5,Floor #3,Corridor #1 which means that relay R56 is installed in Corridor #1 located on Floor #3 of Building #5; the Location Data of Relay ID R57 is x57,y57,z57 and its Reference Data is Building #5,Floor #3,Corridor #1 which means that relay R57 is installed in Corridor #1 located on Floor #3 of Building #5; the Location Data of Relay ID R58 is x58,y58,z58 and its Reference Data is Building #5,Floor #3,Corridor #1 which means that relay R58 is installed in Corridor #1 located on Floor #3 of Building #5; the Location Data of Relay ID R59 is x59,y59,z59 and its Reference Data is Building #5,Floor #3,Corridor #1 which means that relay R59 is installed in Corridor #1 located on Floor #3 of Building #5; the Location Data of Relay ID R60 is x60,y60,z60 and its Reference Data is Building #5,Floor #3,Corridor #1 which means that relay R60 is installed in Corridor #1 located on Floor #3 of Building #5; the Location Data of Relay ID R61 is x61,y61,z61 and its Reference Data is Building #5,Floor #3,Corridor #1 which means that relay R61 is installed in Corridor #1 located on Floor #3 of Building #5; the Location Data of Relay ID R62 is x62,y62,z62 and its Reference Data is Building #5,Floor #3,Corridor #1 which means that relay R62 is installed in Corridor #1 located on Floor#3 of Building #5; and the Location Data of Relay ID R63 is x63,y63,z63 and its Reference Data is Building #5,Floor #3,Corridor #1 which means that relay R63 is installed in Corridor #1 located on Floor #3 of Building #5.

FIG. 940 illustrates the sequence of the software program stored in GPS Software Storage Area H45*b* (FIG. 938) of Host H (FIG. 429). Assume that Devices A, B, and C are located in Room #1 (Room 45RM (FIG. 925)). Referring to FIG. 940, Host H (FIG. 429) identifies the locations of Devices A, B, and C by utilizing the GPS system based on the data received from the relevant relays (S1). In the present example, Host H identifies the locations of Devices A, B, and C by calculating the data received from relays R51 through R54. Next, Host H retrieves data from Relay Location Data Storage Area H45*c*5 (FIG. 939*a*) the Relay ID, the Location Data and the Reference Data of the corresponding relays (S2). In the present example, the Relay ID, the Location Data and the Reference Data of relays R51 through R54 are retrieved. Host H then retrieves the map data regarding the surrounding area from Map Data Storage Area H45*c*2 (FIG. 939) and also the corresponding 3D map data from 3D Map Data Storage Area H45*c*3 (FIG. 939) (S3). In the present example, Host H retrieves the map data and the 3D map data of the area surrounding Building 45BLD (FIG. 924). Next, Host H retrieves the character data stored in Character Data Storage Area H45*c*4 (FIG. 939) which are designed to be displayed on LCD 201 (FIG. 1) of Device A (S4). The examples of the character data retrieved by Host H are the image data of Building 45BLD (FIG. 924) and Room 45RM (FIG. 925) as described in FIGS. 929 and 930. The data retrieved in S1 through S4 are sent to Device A (S5).

FIG. 941 illustrates the information stored in RAM 206 (FIG. 1) of Device A. As described in FIG. 941, RAM 206 includes GPS Information Storage Area 20645*a* of which the details are described in FIG. 942.

The data and software programs stored in GPS Information Storage Area 20645*a* (FIG. 941) are downloaded from Host H (FIG. 429) in the manner described in FIGS. 401 through 407.

FIG. 942 illustrates the storage areas included in GPS information Storage Area 20645*a* (FIG. 941). As described in FIG. 942, GPS Information Storage Area 20645*a* includes GPS Software Storage Area 20645*b* and GPS Data Storage Area 20645*c*. GPS Software Storage Area 20645*b* stores the software programs necessary to implement the present function on the side of Device A, such as the one described in FIG. 944. GPS Data Storage Area 20645*c* stores the data necessary to implement the present function on the side of Device A, such as the ones described in FIG. 943.

FIG. 943 illustrates the storage areas included in GPS Data Storage Area 20645*c* (FIG. 942). As described in FIG. 943, GPS Data Storage Area 20645*c* includes Communication Device Location Data Storage Area 20645*c*1, Map Data Storage Area 20645*c*2, 3D Map Data Storage Area 20645*c*3, Character Data Storage Area 20645*c*4, and Relay Location Data Storage Area 20645*c*5. Communication Device Location Data Storage Area 20645*c*1 stores location data of Devices A, B, and C which is retrieved in S1 of FIG. 940. Map Data Storage Area 20645*c*2 stores the map data which is retrieved in S2 of FIG. 940. 3D Map Data Storage Area 20645*c*3 stores a three-dimensional version of map data corresponding to the map data stored in Map Data Storage Area 20645*c*2, which is also retrieved in S2 of FIG. 940. Character Data Storage Area 20645*c*4 stores character data designed to be displayed on LCD 201 (FIG. 1) of Device A which are retrieved in S4 of FIG. 940. Relay Location Data Storage Area 20645*c*5 stores the location data of the relays and relating data there to which are retrieved in S2 of FIG. 940.

FIG. 943*a* illustrates the data stored in Relay Location Data Storage Area 20645*c*5 (FIG. 943) which are retrieved in S2 of FIG. 940. Referring to FIG. 943*a*, Relay Location Data Storage Area 20645*c*5 (FIG. 943) stores a plurality of the Relay ID, the Location Data and the Reference Data. The column Relay ID stores the identifications assigned to each relay. The column Location Data stores location data of each relay in x, y, z format utilized for calculating the location of Devices A, B, and C by the GPS system of which the details are explained in FIGS. 20*a* through 26. The column Reference Data stores the identifications of the building, floor number, and the room identification in which the relays are installed. Assume that Building 45BLD (FIG. 924) is assigned as 'Building #5', Floor 45FLR3 (FIG. 924) is assigned as 'Floor #3', Room 45RM (FIG. 925) is assigned as 'Room #1', and Corridor 45CRD (FIG. 926) is assigned as 'Corridor #1'. Taking the data described in FIG. 943*a* for example, the Location Data of Relay ID R51 is x51,y51,z51 and its Reference Data is Building #5,Floor #3,Room #1 which means that relay R51 is installed in Room #1 located on Floor #3 of Building #5. In the same manner, the Location Data of Relay ID R52 is x52,y52,z52 and its Reference Data is Building #5,Floor #3,Room #1 which means that relay R52 is installed in Room #1 located on Floor #3 of Building #5; the Location Data of Relay ID R53 is x53,y53,z53 and its Reference Data is Building #5,Floor #3,Room #1 which means that relay R53 is installed in Room #1 located on Floor #3 of Building #5; and the Location Data of Relay ID R54 is x54,y54,z54 and its Reference Data is Building #5,Floor #3,Room #1 which means that relay R54 is installed in Room #1 located on Floor #3 of Building #5.

FIG. 943*b* illustrates the sequence of the software program stored in GPS Software Storage Area 20645*b* (FIG. 942) of Communication Device 200 which receives the data sent in S5 of FIG. 940. Referring to the present drawing, CPU 211 (FIG. 1) receives the data sent from Host H (FIG. 429) in S5 of FIG. 940 (S1), and stores the data in the relevant areas of GPS Data Storage Area 20645*c* (FIG. 943) (S2).

FIG. 944 illustrates the sequence of the software program stored in GPS Software Storage Area 20645*b* (FIG. 942) of Communication Device 200 to select the display type. Referring to FIG. 944, the user of Device A selects the display type by utilizing Input Device 210 (FIG. 1) or via voice recognition system in the manner described in FIG. 927. Here, the display type available in the present embodiment are the display type #1 (which displays the area map with the indication of the locations of Devices A, B, and C therein as described in FIG. 928), the display type #2 (which displays the building and each floor with the indication of the locations of Devices A, B, and C therein as described in FIG. 929), and the display type #3 (which displays the room and the indication of the locations of Devices A, B, and C therein as described in FIG. 930) (S1).

FIG. 945 illustrates the sequence of the software program stored in GPS Software Storage Area 20645*b* (FIG. 942) of Communication Device 200 when display type #1 is selected in S1 of FIG. 944. Referring to FIG. 945, CPU 211 (FIG. 1) retrieves the map data from Map Data Storage Area 20645*c*2 (FIG. 943) (S1). CPU 211 then retrieves the location data of Devices A, B, and C from Communication Device Location Data Storage Area 20645*c*1 (FIG. 943) (S2). CPU 211 identifies the locations of Devices A, B, and C in the retrieved map data (S3). The retrieved map data and the locations of Devices A, B, and C therein are displayed on LCD 201 (FIG. 1) as described in FIG. 928 (S4). As another embodiment, a 3D map data may also be displayed. Namely, CPU 211 (FIG. 1) retrieves the 3D map data from 3D Map Data Storage Area 20645*c*3 (FIG. 943) (S1). CPU 211 then retrieves the location data of Devices A, B, and C from Communication Device Location Data Storage Area 20645*c*1 (FIG. 943) (S2). CPU 211 identifies the locations of Devices A, B, and C in the retrieved 3D map data (S3). The retrieved 3D map data and the locations of Devices A, B, and C therein are displayed on LCD 201 (FIG. 1) (S4).

FIG. 946 illustrates the sequence of the software program stored in GPS Software Storage Area 20645*b* (FIG. 942) when display type #2 is selected in S1 of FIG. 944. Referring to FIG. 946, CPU 211 (FIG. 1) retrieves the character data of Building 45BLD (FIG. 924) from Character Data Storage Area 20645*c*4 (FIG. 943) (S1). CPU 211 then retrieves the location data of Devices A, B, and C from Communication Device Location Data Storage Area 20645*c*1 (FIG. 943) (S2). CPU 211 identifies the locations of Devices A, B, and C in Building 45BLD (S3). Building 45BLD and the locations of Devices A, B, and C therein are displayed on LCD 201 (FIG. 1) as described in FIG. 929 (S4).

FIG. 947 illustrates the sequence of the software program stored in GPS Software Storage Area 20645*b* (FIG. 942) when display type #3 is selected in S1 of FIG. 944. Referring to FIG. 947, CPU 211 (FIG. 1) retrieves the character data of Room 45RM (FIG. 925) from Character Data Storage Area 20645*c*4 (FIG. 943) (S1). CPU 211 then retrieves the location data of Devices A, B, and C from Communication Device Location Data Storage Area 20645*c*1 (FIG. 943) (S2). CPU 211 identifies the locations of Devices A, B, and C in Room 45RM (S3). Room 45RM and the locations of Devices A, B, and C therein are displayed on LCD 201 (FIG. 1) as described in FIG. 930 (S4).

<<Multiple Party Pin-Pointing Function—Another Embodiment>>

FIGS. 948 through 950*f* illustrates another embodiment of the present function which enables to display the locations of the selected devices and display each device in a split window.

FIG. 948 illustrates both the sequence of the software program stored in GPS Software Storage Area 20645*b* (FIG. 942) of Communication Device 200 and the sequence of the software program stored in GPS Software Storage Area H45*b* (FIG. 938) of Host H (FIG. 429). Referring to the present drawing, CPU 211 (FIG. 1) of Communication Device 200 displays a list of devices (in the present example, Device A, B, and C) (S1). The devices of which the locations are to be displayed on LCD 201 (FIG. 1) are selected therefrom by utilizing Input Device 210 (FIG. 1) or via voice recognition system (S2). The device data which represents the identifications of the devices selected in S2 is sent to Host H (S3). Host H receives the device data to identify the location of each device (S4). Assume hereinafter that the devices selected in S2 are Device A, B, and C.

FIG. 949 illustrates the sequence of the software program stored in GPS Software Storage Area H45*b* (FIG. 938) of Host H (FIG. 429). Referring to the present drawing, Host H identifies the locations of the devices selected in S2 of FIG. 948 (i.e., Devices A, B, and C) by utilizing the GPS system based on the data received from the relevant relays (S1). Next, Host H retrieves the data from Relay Location Data Storage Area H45*c*5 (FIG. 939*a*) the Relay ID, the Location Data and the Reference Data of the corresponding relays for each device (S2). Host H then retrieves the map data regarding the surrounding area from Map Data Storage Area H45*c*2 (FIG. 939) and also the corresponding 3D map data from 3D Map Data Storage Area H45*c*3 (FIG. 939) (S3) for each device. Next, Host H retrieves the character data stored in Character Data Storage Area H45*c*4 (FIG. 939) for each device which are designed to be displayed on LCD 201 (FIG. 1) of Device A (S4). The data retrieved in S1 through S4 are sent to Device A (S5).

FIG. 949*a* illustrates the sequence of the software program stored in GPS Software Storage Area 20645*b* (FIG. 942) of Communication Device 200 which receives the data sent from Host H (FIG. 429) in S5 of FIG. 949. Referring to the present drawing, CPU 211 (FIG. 1) receives the data sent from Host H in S5 of FIG. 949 (S1), and stores the data in the relevant areas of GPS Data Storage Area 20645*c* (FIG. 943) (S2).

FIG. 950 illustrates the sequence of the software program stored in GPS Software Storage Area 20645*b* (FIG. 942) of Communication Device 200 to select the display type to display the location of Device A. Referring to FIG. 950, the user of Device A selects the display type by utilizing Input Device 210 (FIG. 1) or via voice recognition system in the manner described in FIG. 927. Here, the display type available in the present embodiment are the display type #1 (which displays the area map with the indication of the location of Devices A), the display type #2 (which displays the building and each floor with the indication of the locations of Devices A), and the display type #3 (which displays the room and the indication of the location of Device A) (S1).

FIG. 950*a* illustrates the sequence of the software program stored in GPS Software Storage Area 20645*b* (FIG. 942) of Communication Device 200 to select the display type to display the location of Device B. Referring to FIG. 950*a*, the user of Device A selects the display type by utilizing Input Device 210 (FIG. 1) or via voice recognition system in the manner described in FIG. 927. Here, the display type available in the present embodiment are the display type #1 (which displays the area map with the indication of the location of Devices B), the display type #2 (which displays the building and each floor with the indication of the locations of Devices B), and the display type #3 (which displays the room and the indication of the location of Device B) (S1).

FIG. 950*b* illustrates the sequence of the software program stored in GPS Software Storage Area 20645*b* (FIG. 942) of Communication Device 200 to select the display type to display the location of Device C. Referring to FIG. 950*a*, the user of Device A selects the display type by utilizing Input Device 210 (FIG. 1) or via voice recognition system in the manner described in FIG. 927. Here, the display type available in the present embodiment are the display type #1 (which displays the area map with the indication of the location of Devices C), the display type #2 (which displays the building and each floor with the indication of the locations of Devices C), and the display type #3 (which displays the room and the indication of the location of Device C) (S1).

FIG. 950*c* illustrates the sequence of the software program stored in GPS Software Storage Area 20645*b* (FIG. 942) of Communication Device 200 to display on LCD 201 (FIG. 1) the locations of Devices A, B, and C in the split windows. Referring to the present drawing, CPU 211 (FIG. 1) displays the split windows on LCD 201 (S1). Three split windows, split window #1, split window #2, and split window #3, are displayed on LCD 201 in the present embodiment to display the locations of Devices A, B, and C respectively. CPU 211 displays the location of Device A in the split window #1 by utilizing the display type selected in FIG. 950 (S2). CPU 211 displays the location of Device B in the split window #2 by utilizing the display type selected in FIG. 950*a* (S3). CPU 211 displays the location of Device C in the split window #3 by utilizing the display type selected in FIG. 950*b* (S4).

FIG. 950*d* illustrates the sequence of the software program stored in GPS Software Storage Area 20645*b* (FIG. 942) of Communication Device 200 when display type #1 is selected in S1 of FIGS. 950, 950*a*, and 950*b*. Referring to FIG. 950*d*, CPU 211 (FIG. 1) retrieves the map data from Map Data Storage Area 20645*c*2 (FIG. 943) (S1). CPU 211 then retrieves the location data of the relevant device (i.e., Device A in FIG. 950, Device B in FIG. 950*a*, and Device C in FIG. 950*b*) from Communication Device Location Data Storage Area 20645*c*1 (FIG. 943) (S2). CPU 211 identifies the location of the relevant device (i.e., Device A in FIG. 950, Device B in FIG. 950*a*, and Device C in FIG. 950*b*) in the retrieved map data (S3). The retrieved map data and the location of the relevant device therein is displayed in the relevant split window (the split window #1 if Device A, the split window #2 if Device B, and the split window #3 if Device C) as described in S2 of FIG. 950*c* (S4). As another embodiment, a 3D map data may also be displayed. Namely, CPU 211 (FIG. 1) retrieves the 3D map data from 3D Map Data Storage Area 20645*c*3 (FIG. 943) (S1). CPU 211 then retrieves the location data of the relevant device from Communication Device Location Data Storage Area 20645*c*1 (FIG. 943) (S2). CPU 211 identifies the location of the relevant device in the retrieved 3D map data (S3). The retrieved 3D map data and the location of the relevant device therein are displayed in the relevant split window as described in FIG. 950*c* (S4).

FIG. 950*e* illustrates the sequence of the software program stored in GPS Software Storage Area 20645*b* (FIG. 942) of Communication Device 200 when display type #2 is selected in S1 of FIGS. 950, 950*a*, and 950*b*. Referring to FIG. 950*e*, CPU 211 (FIG. 1) retrieves the character data of Building 45BLD (FIG. 924) from Character Data Storage Area 20645*c*4 (FIG. 943) (S1). CPU 211 then retrieves the location data of the relevant device (i.e., Device A in FIG. 950, Device B in FIG. 950*a*, and Device C in FIG. 950*b*) from Communication Device Location Data Storage Area 20645*c*1 (FIG. 943) (S2). CPU 211 identifies the location of the relevant device in Building 45BLD (S3). Building 45BLD and the location of the relevant device (i.e., Device A in FIG. 950, Device B in FIG. 950*a*, and Device C in FIG. 950*b*) therein are displayed in the relevant split window as described in FIG. 950*c* (S4).

FIG. 950*f* illustrates the sequence of the software program stored in GPS Software Storage Area 20645*b* (FIG. 942) of Communication Device 200 when display type #3 is selected in S1 of FIGS. 950, 950*a*, and 950*b*. Referring to FIG. 950*f*, CPU 211 (FIG. 1) retrieves the character data of Room 45RM (FIG. 925) from Character Data Storage Area 20645*c*4 (FIG. 943) (S1). CPU 211 then retrieves the location data of the relevant device (i.e., Device A in FIG. 950, Device B in FIG. 950*a*, and Device C in FIG. 950*b*) from Communication Device Location Data Storage Area 20645*c*1 (FIG. 943) (S2). CPU 211 identifies the location of the relevant device in Room 45RM (S3). Room 45RM and the location of the relevant device therein are displayed in the relevant split window as described in FIG. 950*c* (S4).

For the avoidance of doubt, the concept described in FIGS. 924 through 950*f* is also applicable to display the locations of any number of devices.

<<Multiple Party Pin-Pointing Function—Summary>>

(1) A positioning system comprising a plurality of relays, a host, a communication device, a target device, said plurality of relays are installed in an artificial structure, said host identifies the location of said target device located in said artificial structure, said receiver device comprises a display, and said display outputs a character data of said artificial structure with a mark indicating the location of said target device located therein.

(2) A communication device comprising a display, a memory, a CPU, wherein said memory stores a character data of an artificial structure, said memory stores a location data, and said display outputs said character data of said artificial structure with a mark corresponding to said location data.

(3) A positioning system comprising a plurality of relays, a host, said host comprises a memory stored a character data, said plurality of relays are installed in an artificial structure, said host calculates an location data based on data received from said plurality of relays, said host retrieves said character data from said memory, and said host outputs said location data and said character data.

<<Digital Camera Function>>

FIGS. 951 through 968 illustrate the digital camera function which enables Communication Device 200 to take digital photos by utilizing CCD Unit 214 (FIG. 1).

FIG. 951 illustrates the storage area included in RAM 206 (FIG. 1). As described in the present drawing, RAM 206 includes Digital Camera Information Storage Area 20646*a* of which the data and the software programs stored therein are described in FIG. 951*a*.

The data and software programs stored in Digital Camera Information Storage Area 20646*a* (FIG. 951) are downloaded from Host H (FIG. 429) in the manner described in FIGS. 401 through 407.

FIG. 951*a* illustrates the storage areas included in Digital Camera Information Storage Area 20646*a* (FIG. 951). As described in the present drawing, Digital Camera Information Storage Area 20646*a* includes Digital Camera Data Storage Area 20646*b* and Digital Camera Software Storage Area 20646*c*. Digital Camera Data Storage Area 20646*b* stores the data necessary to implement the present function, such as the ones described in FIGS. 952 through 954. Digital Camera Software Storage Area 20646*c* stores the software programs necessary to implement the present function, such as the ones described in FIG. 955.

FIG. 952 illustrates the storage areas included in Digital Camera Data Storage Area 20646*b* (FIG. 951*a*). As described in the present drawing, Digital Camera Data Storage Area 20646*b* includes Photo Data Storage Area 20646*b*1 and Digital Camera Function Data Storage Area 20646*b*2. Photo Data Storage Area 20646*b*1 stores the data described in FIG. 953. Digital Camera Function Data Storage Area 20646*b*2 stores the data stored in FIG. 954.

FIG. 953 illustrates the data stored in Photo Data Storage Area 20646*b*1 (FIG. 952). As described in the present drawing, Photo Data Storage Area 20646*b*1 comprises two columns, i.e., 'Photo ID' and 'Photo Data'. Column 'Photo ID' stores the identifications of the photo data, and column 'Photo Data' stores a plurality of photo data taken by implementing the present function. In the example described in the present drawing, Photo Data Storage Area 20646*b*1 stores the following data: 'Photo ID' Photo #1 of which the 'Photo Data' is 46PD1; 'Photo ID' Photo #2 of which the 'Photo Data' is 46PD2; 'Photo ID' Photo #3 of which the 'Photo Data' is 46PD3; 'Photo ID' Photo #4 of which the 'Photo Data' is 46PD4; and 'Photo ID' Photo #5 of which the 'Photo Data' is 46PD5.

FIG. 954 illustrates the storage areas included in Digital Camera Function Data Storage Area 20646*b*2 (FIG. 952). As described in the present drawing, Digital Camera Function Data Storage Area 20646*b*2 includes Quality Data Storage Area 20646*b*2*a*, Multiple Photo Shooting Number Data Storage Area 20646*b*2*b*, and Strobe Data Storage Area 20646*b*2*c*. Quality Data Storage Area 20646*b*2*a* stores the data selected in S2 of FIG. 957. Multiple Photo Shooting Number Data Storage Area 20646*b*2*b* stores the data selected in S2 of FIG. 958. Strobe Data Storage Area 20646*b*2*c* stores the data selected in S2 of FIG. 959.

FIG. 955 illustrates the software programs stored in Digital Camera Software Storage Area 20646*c* (FIG. 951*a*). As described in the present drawing, Digital Camera Software Storage Area 20646*c* stores Quality Selecting Software 20646*c*1, Multiple Photo Shooting Software 20646*c*2, Trimming Software 20646*c*3, Digital Zooming Software 20646*c*4, Strobe Software 20646*c*5, Digital Camera Function Selecting Software 20646*c*6, Multiple Photo Shooting Number Selecting Software 20646*c*7, Strobe On/Off Selecting Software 20646*c*8, Photo Data Shooting Software 20646*c*9, and Multiple Photo Shooting Software 20646*c*10. Quality Selecting Software 20646*c*1 is the software program described in FIG. 957. Multiple Photo Shooting Software 20646*c*2 is the software program described in FIG. 961. Trimming Software 20646*c*3 is the software program described in FIG. 968. Digital Zooming Software 20646*c*4 is the software program described in FIG. 965. Strobe Software 20646*c*5 is the software program described in FIG. 962. Digital Camera Function Selecting Software 20646*c*6 is the software program described in FIG. 956. Multiple Photo Shooting Number Selecting Software 20646*c*7 is the software program described in FIG. 958. Strobe On/Off Selecting Software 20646*c*8 is the software program described in FIG. 959. Photo Data Shooting Software 20646*c*9 is the software program described in FIG. 960.

FIG. 956 illustrates Digital Camera Function Selecting Software 20646*c*6 stored in Digital Camera Software Storage Area 20646*c* (FIG. 955) which administers the overall flow of displaying the functions and selecting the option for each function. Referring to the present drawing, a list of functions is displayed on LCD 201 (FIG. 1) (S1). The items displayed on LCD 201 are 'Quality', 'Multiple Photo', and 'Strobe'. A function is selected by utilizing Input Device 210 (FIG. 1) or via voice recognition system (S2), and the relevant software program is activated thereafter (S3). In the present embodiment, Quality Selecting Software 20646*c*1 described in FIG. 957 is activated when 'Quality' displayed on LCD 201 is selected in S2. Multiple Photo Shooting Number Selecting Software 20646*c*7 described in FIG. 958 is activated when 'Multiple Photo' is selected in S2. Strobe On/Off Selecting Software 20646*c*8 described in FIG. 959 is activated when 'Strobe' is selected in S2.

FIG. 957 illustrates Quality Selecting Software 20646*c*1 stored in Digital Camera Software Storage Area 20646*c* (FIG. 955) which selects the quality of the photo data taken by implementing the present function. Referring to the present drawing, a list of options is displayed on LCD 201 (FIG. 1) (S1). The options displayed on LCD 201 are 'High', 'STD', and 'Low' in the present embodiment. One of the options is selected by utilizing Input Device 210 (FIG. 1) or via voice recognition system (S2). The resolution of the photo data taken is high if 'High' is selected; the resolution of the photo taken is standard if 'STD' is selected; and the resolution of the photo taken is low if 'Low' is selected. The selected option is stored as the quality data in Quality Data Storage Area 20646*b*2*a* (FIG. 954) (S3).

FIG. 958 illustrates Multiple Photo Shooting Number Selecting Software 20646*c*7 stored in Digital Camera Software Storage Area 20646*c* (FIG. 955) which selects the number of photos taken by a single photo shooting signal. Referring to the present drawing, a list of options is displayed on LCD 201 (FIG. 1) (S1). The options displayed on LCD 201 are figures from '1' through '10'. Only one photo is taken by a photo shooting signal if '1' is selected; two photos are taken by a photo shooting signal if '2' is selected; three photos are taken by a photo shooting signal if '3' is selected; four photos are taken by a photo shooting signal if '4' is selected; five photos are taken by a photo shooting signal if '5' is selected; six photos are taken by a photo shooting signal if '6' is selected; seven photos are taken by a photo shooting signal if '7' is selected; eight photos are taken by a photo shooting signal if '8' is selected; nine photos are taken by a photo shooting signal if '9' is selected; and ten photos are taken by a photo shooting signal if '10' is selected. A digit from '1' through '10' is selected by utilizing Input Device 210 (FIG. 1) or via voice recognition system (S2). The selected digital is stored as the multiple photo shooting number data in Multiple Photo Shooting Number Data Storage Area 20646*b*2*b* (FIG. 954) (S3).

FIG. 959 illustrates Strobe On/Off Selecting Software 20646*c*8 stored in Digital Camera Software Storage Area 20646*c* (FIG. 955) which selects Flash Light Unit 220 (FIG. 467*a*) to be activated or not when a photo is taken. Referring to the present drawing, a list of options is displayed on LCD 201 (FIG. 1) (S1). The options displayed on LCD 201 are 'On' and 'Off'. Flash Light Unit 220 is activated at the time photo is taken if 'On' is selected; and Flash Light Unit 220 is not activated at the time photo is taken if 'Off' is selected. One of the two options is selected by utilizing Input Device 210 (FIG. 1) or via voice recognition system (S2). The selected option is stored as the strobe data in Strobe Data Storage Area 20646*b*2*c* (FIG. 954) (S3).

FIG. 960 illustrates Photo Data Shooting Software 20646*c*9 stored in Digital Camera Software Storage Area 20646*c* (FIG. 955) which takes photo(s) in accordance with the options selected in FIG. 957. Referring to the present drawing, a photo shooting signal is input by utilizing Input Device 210 (FIG. 1) or via voice recognition system (S1). Here, the photo shooting signal indicates CPU 211 (FIG. 1) to input photo data to CCD Unit 214 (FIG. 1) and store the data in Photo Data Storage Area 20646*b*1 (FIG. 953). CPU 211 then retrieves the quality data from Quality Data Storage Area 20646*b*2*a* (FIG. 954) (S2). The photo data is input via CCD Unit 214 (S3), and the data is stored in Photo Data Storage Area 20646*b*1 (FIG. 953) with new photo ID in accordance with the quality data retrieved in S2 (S4).

FIG. 961 illustrates Multiple Photo Shooting Software 20646*c*2 stored in Digital Camera Software Storage Area 20646*c* (FIG. 955) which takes photo(s) in accordance with the options selected in FIG. 958. Referring to the present drawing, a photo shooting signal is input by utilizing Input Device 210 (FIG. 1) or via voice recognition system (S1). CPU 211 (FIG. 1) retrieves the multiple photo shooting number data from Multiple Photo Shooting Number Data Storage Area 20646*b*2*b* (FIG. 954) (S2). CPU 211 then takes photos in accordance with the multiple photo shooting number data retrieved in S2 (S3). Namely, only one photo is taken by a photo shooting signal if the multiple photo shooting number data retrieved in S2 is '1'; two photos are taken by a photo shooting signal if the multiple photo shooting number data retrieved in S2 is '2'; three photos are taken by a photo shooting signal if the multiple photo shooting number data retrieved in S2 is '3'; four photos are taken by a photo shooting signal if the multiple photo shooting number data retrieved in S2 is '4'; five photos are taken by a photo shooting signal if the multiple photo shooting number data retrieved in S2 is '5'; six photos are taken by a photo shooting signal if the multiple photo shooting number data retrieved in S2 is '6'; seven photos are taken by a photo shooting signal if the multiple photo shooting number data retrieved in S2 is '7'; eight photos are taken by a photo shooting signal if the multiple photo shooting number data retrieved in S2 is '8'; nine photos are taken by a photo shooting signal if the multiple photo shooting number data retrieved in S2 is '9'; and ten photos are taken by a photo shooting signal if the multiple photo shooting number data retrieved in S2 is '10'.

FIG. 962 illustrates Strobe Software 20646*c*5 stored in Digital Camera Software Storage Area 20646*c* (FIG. 955) which takes photo(s) in accordance with the options selected in FIG. 959. Referring to the present drawing, a photo shooting signal is input by utilizing Input Device 210 (FIG. 1) or via voice recognition system (S1). CPU 211 (FIG. 1) retrieves the strobe data from Strobe Data Storage Area 20646*b*2*c* (FIG. 954) (S2). If the strobe data is 'On' (S3), CPU 211 activates Flash Light Unit 220 (FIG. 467*a*) each time a photo is taken (S4). In other words, Strobe Software 20646*c*5 is harmonized with Multiple Photo Shooting Software 20646*c*2 described in FIG. 961. Namely, Flash Light Unit 220 is activated for one time if one photo is taken by a single photo shooting signal. Flash Light Unit 220 is activated for two times if two photos are taken by a single photo shooting signal. Flash Light Unit 220 is activated for three times if three photos are taken by a single photo shooting signal. Flash Light Unit 220 is activated for four times if four photos are taken by a single photo shooting signal. Flash Light Unit 220 is activated for five times if five photos are taken by a single photo shooting signal. Flash Light Unit 220 is activatedfor six times if six photos are taken by a single photo shooting signal. Flash Light Unit 220 is activated for seven times if seven photos are taken by a single photo shooting signal. Flash Light Unit 220 is activated for eight times if eight photos are taken by a single photo shooting signal. Flash Light Unit 220 is activated for nine times if nine photos are taken by a single photo shooting signal. Flash Light Unit 220 is activated for ten times if ten photos are taken by a single photo shooting signal.

FIG. 963 illustrates one embodiment of the zooming function which zooms the photo data stored in Photo Data Storage Area 20646*b*1 (FIG. 953). Referring to the present drawing, a certain photo selected by the user of Communication Device 200 is displayed on LCD 201 (FIG. 1). Assuming that the user intends to zoom Object 20646Obj, the object displayed on LCD 201, to a larger size. The user selects Area 46ARa which includes Object 20646Obj by utilizing Input Device 210 (FIG. 1) or via voice recognition system, and the selected area is zoomed to fit the size of LCD 201. The zoomed photo is replaced with the original photo.

FIG. 964 illustrates the operation performed in RAM 206 (FIG. 1) to implement the zooming function described in FIG. 963. A certain photo data selected by the user of Communication Device 200 is stored in Area 20646ARa of RAM 206. Here, the size of the photo data is as same as that of Area 20646ARa. Referring to the present drawing, Display Area 20646DA is the area which is displayed on LCD 201 (FIG. 1). Area 46ARa is the area which is selected by the user of Communication Device 200. Object 20646Obj is the object included in the photo data. Area 46ARa which includes Object 20646Obj is selected by utilizing Input Device 210 (FIG. 1) or via voice recognition system, and the photo data stored in Area 20646ARa is zoomed to the size in which the size of Area 46ARa equals to that of Display Area 20646DA. The zoomed photo data is replaced with the original photo data and stored in Photo Data Storage Area 20646*b*1 (FIG. 953). The portion of the photo data which does not fit Area 20646ARa is cropped.

FIG. 965 illustrates Digital Zooming Software 20646*c*4 stored in Digital Camera Software Storage Area 20646*c* (FIG. 955) which implements the operation described in FIG. 964.

Referring to the present drawing, CPU 211 (FIG. 1) displays a list of the photo IDs representing the photo data stored in Photo Data Storage Area **20646*b*1 (FIG. 953) as well as the thumbnails (S1). A certain photo data is selected by utilizing Input Device 210 (FIG. 1) or via voice recognition system (S2), and the selected photo data is displayed on LCD 201 (FIG. 1) as described in FIG. 963 (S3). Area 46ARa described in FIG. 963 is selected by utilizing Input Device 210 or via voice recognition system (S4). When a zooming signal is input by utilizing Input Device 210 or via voice recognition system (S5), CPU 211 (FIG. 1) implements the process described in FIG. 964 and replaces the original photo data with the zoomed photo data, which is stored in Photo Data Storage Area 20646*b*1 (FIG. 953) (S6**).

FIG. 966 illustrates one embodiment of the trimming function which trims the photo data stored in Photo Data Storage Area **20646*b*1 (FIG. 953) and thereby moves the selected object to the center of the photo data. Referring to the present drawing, a certain photo selected by the user of Communication Device 200 is displayed on LCD 201 (FIG. 1). Point 20646PTa adjacent to Object 20646Obj is selected by utilizing Input Device 210 (FIG. 1) or via voice recognition system, and the photo is centered at Point 20646**PTa. The trimmed photo is replaced with the original photo.

FIG. 967 illustrates the operation performed in RAM 206 (FIG. 1) to implement the trimming function described in FIG. 966. Referring to the present drawing, Display Area 20646DA is the portion of the photo data which is displayed on LCD 201 (FIG. 1). Object 20646Obj is the object included in the photo data. Point 20646PTa is the point selected by the user of Communication Device 200 adjacent to Object 20646Obj which is centered by the present function. Referring to the present drawing, a certain photo data selected by the user of Communication Device 200 is stored in Area 20646ARb of RAM 206. Here, the size of the photo data is as same as that of Area 20646ARb. Point 20646PTa is selected by utilizing Input Device 210 (FIG. 1) or via voice recognition system, and the photo data is centered at Point 20646PTa by sliding the entire photo data to the right. The trimmed photo data is replaced with the original photo data and stored in Photo Data Storage Area **20646*b*1 (FIG. 953). The portion of the photo data which does not fit Area 20646**ARa is cropped.

FIG. 968 illustrates Trimming Software **20646*c*3 stored in Digital Camera Software Storage Area 20646*c* (FIG. 955) which implements the operation described in FIG. 967. Referring to the present drawing, CPU 211 (FIG. 1) displays a list of the photo IDs representing the photo data stored in Photo Data Storage Area 20646*b*1 (FIG. 953) as well as the thumbnails (S1). A certain photo data is selected by utilizing Input Device 210 (FIG. 1) or via voice recognition system (S2), and the selected photo data is displayed on LCD 201 (FIG. 1) as described in FIG. 966 (S3). Point 20646PTa described in FIG. 966 is selected by utilizing Input Device 210 or via voice recognition system (S4). When a trimming signal is input by utilizing Input Device 210 or via voice recognition system (S5), CPU 211 (FIG. 1) centers the photo data at Point 20646PTa as described in FIG. 697 and replaces the original photo data with the trimmed photo data, which is stored in Photo Data Storage Area 20646*b*1 (FIG. 953) (S6**).

<<Digital Camera Function—Summary>>

(1) A communication device comprising a microphone, a speaker, a display, an input device, a CCD unit, a memory and a multiple mode implementor, wherein said multiple mode implementor implements a voice communication mode and a digital camera mode, a series of audio data are input to and output from said microphone and said speaker respectively when said voice communication mode is implemented, and a photo data is input via said CCD unit at the time a photo shooting signal is input via said input device and stored in said memory when said digital camera mode is implemented.

(2) The quality of said photo data stored in said memory is selected by utilizing said input device in advance of storing said photo data in said memory.

(3) A plurality of photo data are stored in said memory by a single photo shooting signal.

(4) Said photo data stored in said memory is displayed on said display and zoomed when zooming signal is input via said input device.

(5) Said photo data stored in said memory is displayed on said display and trimmed when trimming signal is input via said input device.

<<Phone Number Linking Function>>

FIGS. **968*a* through 983 illustrate the phone number linking function which enables the user of Communication Device 200** to dial a phone number in a convenient manner by automatically displaying a phone number link with the phone number, i.e., underline the phone number and/or change its font color and input the phone number by a simple method such as clicking the link.

FIG. **968*a* illustrates the storage area included in RAM 206 (FIG. 1). As described in the present drawing, RAM 206 includes Phone Number Linking Information Storage Area 20647*a* of which the data and the software programs stored therein are described in FIG. 969**.

The data and software programs stored in Phone Number Linking Information Storage Area **20647*a* (FIG. 968*a*) are downloaded from Host H (FIG. 429) in the manner described in FIGS. 401 through 407**.

FIG. 969 illustrates the storage areas included in Phone Number Linking Information Storage Area **20647*a* (FIG. 968*a*). As described in the present drawing, Phone Number Linking Information Storage Area 20647*a* includes Phone Number Linking Data Storage Area 20647*b* and Phone Number Linking Software Storage Area 20647*c*. Phone Number Linking Data Storage Area 20647*b* stores the data necessary to implement the present function, such as the ones described in FIGS. 970 and 971. Phone Number Linking Software Storage Area 20647*c* stores the software programs necessary to implement the present function, such as the ones described in FIG. 972**.

FIG. 970 illustrates the storage areas included in Phone Number Linking Data Storage Area **20647*b* (FIG. 969). As described in the present drawing, Phone Number Linking Data Storage Area 20647*b* includes Phone Number Data Storage Area 20647*b*1 and Temporary Data Storage Area 20647*b*2. Phone Number Data Storage Area 20647*b*1 stores data described in FIG. 971. Temporary Data Storage Area 20647*b*2** is utilized to temporarily store various types of data, which is also utilized as a work area.

FIG. 971 illustrates the data stored in Phone Number Data Storage Area **20647*b*1 (FIG. 970). As described in the present drawing, Phone Number Data Storage Area 20647*b*1 comprises two columns, i.e., “Phone Number ID” and “Phone Number Data”. Column “Phone Number ID” stores the identifications of the phone number data stored in column “Phone Number ID”, and column “Phone Number ID” stores a plurality of phone number data detected by implementing the present function as described hereinafter. In the present example described in the present drawing, Phone Number Data Storage Area 20647*b*1 stores the “Phone Number ID” PN #1 of which the corresponding “Phone Number Data” is (916) 455-1293; the “Phone Number ID” PN #2** of which the corresponding “Phone Number Data” is (408) 424-9387; and the "Phone Number ID" PN #3 of which the corresponding "Phone Number Data" is (544) 293-2938.

FIG. 972 illustrates the software programs stored in Phone Number Linking Software Storage Area 20647*c* (FIG. 969). As described in the present drawing, Phone Number Linking Software Storage Area 20647*c* stores Phone Number Detecting Software 20647*c*1, Phone Number Detecting Software 20647*c*2, Phone Number Detecting Software 20647*c*3, Phone Number Displaying Software 20647*c*4, Phone Number Dialing Software 20647*c*5, and Phone Book Displaying Software 20647*c*6. Phone Number Detecting Software 20647*c*1 is the software program described in FIG. 973. Phone Number Detecting Software 20647*c*2 is the software program described in FIG. 974. Phone Number Detecting Software 20647*c*3 is the software program described in FIG. 975. Phone Number Displaying Software 20647*c*4 is the software program described in FIG. 976. Phone Number Dialing Software 20647*c*5 is the software program described in FIG. 977. Phone Book Displaying Software 20647*c*6 is the software program described in FIG. 978.

FIG. 973 illustrates Phone Number Detecting Software 20647*c*1 stored in Phone Number Linking Software Storage Area 20647*c* (FIG. 972) which detects the phone number data included in an e-mail and displays the phone number data with a phone number link on LCD 201 (FIG. 1). Referring to the present drawing, CPU 211 (FIG. 1) displays the received email on LCD 201 (S1). CPU 211 (FIG. 1) scans the email and if a phone number data is included therein (S2), CPU 211 stores the phone number data in Phone Number Data Storage Area 20647*b*1 (FIG. 971) (S3). CPU 211 displays the phone number data on LCD 201 with a phone number link (i.e., the phone number data is underlined and the font color thereof is changed to another color, such as blue) (S4).

FIG. 974 illustrates Phone Number Detecting Software 20647*c*2 stored in Phone Number Linking Software Storage Area 20647*c* (FIG. 972) which detects the phone number data in real time included in a series of alphanumeric data input by utilizing Input Device 210 (FIG. 1) or via voice recognition system and displays the phone number data with a phone number link on LCD 201 (FIG. 1). Referring to the present drawing, a series of alphanumeric data input by utilizing Input Device 210 (FIG. 1) or via voice recognition system are displayed on LCD 201 (S1). CPU 211 (FIG. 1) monitors each input, and if a phone number data is included therein (S2), CPU 211 stores the phone number data in Phone Number Data Storage Area 20647*b*1 (FIG. 971) (S3). CPU 211 displays the phone number data on LCD 201 with a phone number link (i.e., the phone number data is underlined and the font color thereof is changed to another color, such as blue) (S4).

FIG. 975 illustrates Phone Number Detecting Software 20647*c*3 stored in Phone Number Linking Software Storage Area 20647*c* (FIG. 972) which detects the phone number data included in a file, such as MS Word document and a text file, and displays the phone number data with a phone number link on LCD 201 (FIG. 1). Referring to the present drawing, a file, such as MS Word document and a text file, is opened by utilizing Input Device 210 (FIG. 1) or via voice recognition system (S1). CPU 211 (FIG. 1) scans the file and if a phone number data is included therein (S2), CPU 211 stores the phone number data in Phone Number Data Storage Area 20647*b*1 (FIG. 971) (S3). CPU 211 displays the phone number data on LCD 201 with a phone number link (i.e., the phone number data is underlined and the font color thereof is changed to another color, such as blue) (S4).

FIG. 976 illustrates Phone Number Displaying Software 20647*c*4 stored in Phone Number Linking Software Storage Area 20647*c* (FIG. 972) which displays the phone number data on LCD 201 (FIG. 1) when the phone number data associated with the phone number link by the operation of the software programs described in FIGS. 973 through 975 is selected. Referring to the present drawing, a phone number with a phone number link is selected by utilizing Input Device 210 (FIG. 1) or via voice recognition system (S1). CPU 211 (FIG. 1) retrieves the phone number data from Phone Number Data Storage Area 20647*b*1 (FIG. 971) (2). CPU 211 then displays the retrieved phone number data on LCD 201 in a manner that the user of Communication Device 200 recognizes that the displayed phone number data is ready to be dialed (3).

FIG. 977 illustrates Phone Number Dialing Software 20647*c*5 stored in Phone Number Linking Software Storage Area 20647*c* (FIG. 972) which dials utilizing the phone number data selected in S1 of FIG. 976 from Phone Number Data Storage Area 20647*b*1 (FIG. 971). Referring to the present drawing, CPU 211 (FIG. 1) retrieves the phone number data selected in S1 of FIG. 976 (S1). CPU 211 initiates dialing process (S2) and the line is connected with another communication device in a wireless fashion (S3).

FIG. 978 illustrates Phone Book Displaying Software 20647*c*6 stored in Phone Number Linking Software Storage Area 20647*c* (FIG. 972) which displays the list of phone numbers stored in Phone Number Data Storage Area 20647*b*1 (FIG. 971). Referring to the present drawing, a phone book opening signal indicating to open a phone book is input by utilizing Input Device 210 (FIG. 1) or via voice recognition system (S1). CPU 211 (FIG. 1) retrieves all phone number data from Phone Number Data Storage Area 20647*b*1 (FIG. 971) (S2), and a list of phone number data is displayed on LCD 201 (FIG. 1) (S3).

FIGS. 979 through 983 illustrate another embodiment of the present function which is a simplified version compared to the one explained hereinbefore.

FIG. 979 illustrates another embodiment of Phone Number Detecting Software 20647*c*1 stored in Phone Number Linking Software Storage Area 20647*c* (FIG. 972) which detects the phone number data included in an e-mail and displays the phone number data with a phone number link on LCD 201 (FIG. 1). Referring to the present drawing, CPU 211 (FIG. 1) displays the received email on LCD 201 (S1). CPU 211 (FIG. 1) scans the email and if a phone number data is included therein (S2), CPU 211 stores the phone number data in Temporary Data Storage Area 20647*b*2 (FIG. 971) (S3). CPU 211 displays the phone number data on LCD 201 with a phone number link (i.e., the phone number data is underlined and the font color thereof is changed to another color, such as blue) (S4).

FIG. 980 illustrates another embodiment of Phone Number Detecting Software 20647*c*2 stored in Phone Number Linking Software Storage Area 20647*c* (FIG. 972) which detects the phone number data in real time included in a series of alphanumeric data input by utilizing Input Device 210 (FIG. 1) or via voice recognition system and displays the phone number data with a phone number link on LCD 201 (FIG. 1). Referring to the present drawing, a series of alphanumeric data input by utilizing Input Device 210 (FIG. 1) or via voice recognition system are displayed on LCD 201 (S1). CPU 211 (FIG. 1) monitors each input, and if a phone number data is included therein (S2), CPU 211 stores the phone number data in Temporary Data Storage Area 20647*b*2 (FIG. 971) (S3). CPU 211 displays the phone number data on LCD 201 with a phone number link (i.e., the phone number data is underlined and the font color thereof is changed to another color, such as blue) (S4).

FIG. 981 illustrates another embodiment of Phone Number Detecting Software 20647$c$3 stored in Phone Number Linking Software Storage Area 20647$c$ (FIG. 972) which detects the phone number data included in a file, such as MS Word document and a text file, and displays the phone number data with a phone number link on LCD 201 (FIG. 1). Referring to the present drawing, a file, such as MS Word document and a text file, is opened by utilizing Input Device 210 (FIG. 1) or via voice recognition system (S1). CPU 211 (FIG. 1) scans the file and if a phone number data is included therein (S2), CPU 211 stores the phone number data in Temporary Data Storage Area 20647$b$2 (FIG. 971) (S3). CPU 211 displays the phone number data on LCD 201 with a phone number link (i.e., the phone number data is underlined and the font color thereof is changed to another color, such as blue) (S4).

FIG. 982 illustrates another embodiment of Phone Number Displaying Software 20647$c$4 stored in Phone Number Linking Software Storage Area 20647$c$ (FIG. 972) which displays the phone number data on LCD 201 (FIG. 1) when the phone number data associated with the phone number link by the operation of the software programs described in FIGS. 979 through 971 is selected. Referring to the present drawing, a phone number with a phone number link is selected by utilizing Input Device 210 (FIG. 1) or via voice recognition system (S1). CPU 211 (FIG. 1) retrieves the phone number data from Temporary Data Storage Area 20647$b$2 (FIG. 971) (2). CPU 211 then displays the retrieved phone number data on LCD 201 in a manner that the user of Communication Device 200 recognizes that the displayed phone number data is ready to be dialed (3).

FIG. 983 illustrates another embodiment of Phone Number Dialing Software 20647$c$5 stored in Phone Number Linking Software Storage Area 20647$c$ (FIG. 972) which dials utilizing the phone number data selected in S1 of FIG. 982. Referring to the present drawing, CPU 211 (FIG. 1) retrieves the phone number data selected in S1 of FIG. 982 from Temporary Data Storage Area 20647$b$2 (FIG. 971) (S1). CPU 211 initiates dialing process (S2) and the line is connected with another communication device in a wireless fashion (S3). The phone number data is deleted from Temporary Data Storage Area 20647$b$2 thereafter (S4).

<<Phone Number Linking Function—Summary>>

(1) A communication device comprising a microphone, a speaker, a display, an input device and a multiple mode implementor, wherein said multiple mode implementor implements a voice communication mode and a phone number linking mode, a series of audio data are input to and output from said microphone and said speaker respectively when said voice communication mode is implemented, a phone number link is displayed with a phone number data on said display when said phone number linking mode is implemented.

(2) A communication device comprising a microphone, a speaker, a display, an input device and a multiple mode implementor, wherein said multiple mode implementor implements a voice communication mode and a phone number linking mode, a series of audio data are input to and output from said microphone and said speaker respectively when said voice communication mode is implemented, a phone number link is displayed with a phone number data on said display and said communication device dials said phone number data after said phone number link is selected when said phone number linking mode is implemented.

(3) A phone number linking software program which enables a communication device comprising a microphone, a speaker, a display, an input device and a multiple mode implementor to display a phone number link with a phone number data on said display and said communication device to dial said phone number data after said phone number link is selected wherein said communication device is capable of inputting and outputting a series of audio data to and from said microphone and said speaker respectively.

<<Multiple Window Displaying Function>>

FIGS. 984 through 995 illustrate the multiple window displaying function which displays a plurality of windows on LCD 201 (FIG. 1) of Communication Device 200.

FIG. 984 illustrates the concept of the present function. Referring to the present drawing, the display area of LCD 201 (FIG. 1) is primarily composed of two display areas, i.e., Windows Display Area 20148WDA and Task Bar 20148TB. Windows Display Area 20148WDA is the display area where a plurality of windows are displayed. Task Bar 20148TB is the display area located on the lower part of LCD 201 (FIG. 1) where the icons corresponding to the windows displayed in Windows Display Area 20148WDA are displayed. In the example described in the present drawing, two windows area displayed in Windows Display Area 20148WDA, i.e., Window A and Window B. As described in the present drawing, Window A is displayed on top of Window B which means that Window A has priority over Window B. Two icons, i.e., Icon A which corresponds to Window A and Icon B are which corresponds to Window B are displayed in Task Bar 20148TB.

FIG. 985 illustrates the storage area included in RAM 206 (FIG. 1). As described in the present drawing, RAM 206 includes Multiple Window Displaying Information Storage Area 20648$a$ of which the data and the software programs stored therein are described in FIG. 986.

The data and software programs stored in Multiple Window Displaying Information Storage Area 20648$a$ (FIG. 985) are downloaded from Host H (FIG. 429) in the manner described in FIGS. 401 through 407.

FIG. 986 illustrates the storage areas included in Multiple Window Displaying Information Storage Area 20648$a$ (FIG. 985). As described in the present drawing, Multiple Window Displaying Information Storage Area 20648$a$ includes Multiple Window Displaying Data Storage Area 20648$b$ and Multiple Window Displaying Software Storage Area 20648$c$. Multiple Window Displaying Data Storage Area 20648$b$ stores the data necessary to implement the present function, such as the ones described in FIGS. 987 through 989. Multiple Window Displaying Software Storage Area 20648$c$ stores the software programs necessary to implement the present function, such as the ones described in FIG. 990.

FIG. 987 illustrates the storage area included in Multiple Window Displaying Data Storage Area 20648$b$ (FIG. 986). As described in the present drawing, Multiple Window Displaying Data Storage Area 20648$b$ includes Window Data Storage Area 20648$b$1 which is further explained in FIGS. 988 and 989.

FIG. 988 illustrates the method to identify the location and the size of each window display in Windows Display Area 20148WDA (FIG. 984). Referring to the present drawing, Base Point 20148BP is the point of the upper-left corner of Windows Display Area 20148WDA (FIG. 984). Reference Point 20148RP is the point of the upper-left corner of each window displayed in Windows Display Area 20148WDA. The location of Reference Point 20148RP in Windows Display Area 20148WDA is identified based on the distance from Base Point 20148BP in 'x cm, y cm' format. The size of each window is identified by the width and the height in centimeters.

FIG. 989 illustrates the data stored in Window Data Storage Area 20648$b$1 (FIG. 987). As described in the present drawing, Window Data Storage Area 20648$b$1 comprises six columns, i.e., 'Window ID', 'Reference Point Data', 'Width Data', 'Height Data', 'Priority Data', and 'Icon ID'. Column 'Window ID' stores the identifications of the window data. Column 'Reference Point Data' stores Reference Point 20148RP (FIG. 988) of each window displayed in Windows Display Area 20148WDA (FIG. 988). Column 'Width Data' stores the width of each window in centimeters. Column 'Height Data' stores the height of each window in centimeters. Column 'Priority Data' stores the priority of each window displayed in Windows Display Area 20148WDA. Column 'Icon ID' stores the identifications of the icons displayed in Task Bar 20148TB (FIG. 984). In the example described in the present drawing, the following data area stored in Window Data Storage Area 20648$b$1: the 'Window ID' 'Window #1' of which the 'Reference Point Data', the 'Width Data', the 'Height Data', the 'Priority Data', and the 'Icon ID' are '2 cm, 3 cm', '5 cm', '2 cm', 'Priority #4', and 'Icon #1'; the 'Window ID' 'Window #2' of which the 'Reference Point Data', the 'Width Data', the 'Height Data', the 'Priority Data', and the 'Icon ID' are '1 cm, 2 cm', '4 cm', '4 cm', 'Priority #3', and 'Icon #2'; the 'Window ID' 'Window #3' of which the 'Reference Point Data', the 'Width Data', the 'Height Data', the 'Priority Data', and the 'Icon ID' are '1 cm, 2 cm', '5 cm', '6 cm', 'Priority #2', and 'Icon #3'; and the 'Window ID' 'Window #4' of which the 'Reference Point Data', the 'Width Data', the 'Height Data', the 'Priority Data', and the 'Icon ID' are '2 cm, 3 cm', '4 cm', '5 cm', 'Priority #1', and 'Icon #4'.

Referring to the 'Priority Data', 'Window #4' has the highest priority over the rest of the windows in being displayed in Windows Display Area 20148WDA (i.e., 'Priority #1'), 'Window #3' has the priority over 'Window #2' and 'Window #1' in being displayed in Windows Display Area 20148WDA (i.e., 'Priority #2'), 'Window #2' has the priority over 'Window #1' in being displayed in Windows Display Area 20148WDA (i.e., 'Priority #3'), and 'Window #1' has the lowest priority over the rest of the windows in being displayed in Windows Display Area 20148WDA (i.e., 'Priority #4').

FIG. 990 illustrates the software programs stored in Multiple Window Displaying Software Storage Area 20648$c$ (FIG. 986). As described in the present drawing, Multiple Window Displaying Software Storage Area 20648$c$ stores Window Generating Software 20648$c$1, Window Closing Software 20648$c$2, Window Size Changing Software 20648$c$3, Window Size Minimizing Software 20648$c$4, and Window Size Restoring Software 20648$c$5. Window Generating Software 20648$c$1 is the software program described in FIG. 991. Window Closing Software 20648$c$2 is the software program described in FIG. 992. Window Size Changing Software 20648$c$3 is the software program described in FIG. 993. Window Size Minimizing Software 20648$c$4 is the software program described in FIG. 994. Window Size Restoring Software 20648$c$5 is the software program described in FIG. 995.

FIG. 991 illustrates Window Opening Software 20648$c$1 stored in Multiple Window Displaying Software Storage Area 20648$c$ (FIG. 990) which opens a new window in Windows Display Area 20148WDA (FIG. 984) when a new software program (e.g., MS Word, MS Excel, MS Access, calculator, back-up software program, Windows Explorer, Outlook Express, image viewer, and Internet Explorer) is executed. Referring to the present drawing, when a software program is executed (S1), CPU 211 (FIG. 1) generates a new window data (S2). The size (i.e., the width and the height thereof) may be of the default settings. CPU 211 adds a new Window ID in Window Data Storage Area 20648$b$1 (FIG. 989) for the new window data (S3). CPU 211 further sets the highest 'Priority Data' (i.e., 'Priority #1') for the new window (S4), and stores the new window data generated in S2 as well as the 'Priority Data' set in S4 in Window Data Storage Area 20648$b$1 (S5). CPU 211 updates the 'Priority Data' of the other windows accordingly, i.e., the 'Priority Data' of the other windows are shifted to the one rank lower one and stores the updated 'Priority Data' in Window Data Storage Area 20648$b$1 (S6). CPU 211 displays the new window in Windows Display Area 20148WDA (FIG. 984) (S7) and the new icon on Task Bar 20148TB (FIG. 984) (S8).

FIG. 992 illustrates Window Closing Software 20648$c$2 stored in Multiple Window Displaying Software Storage Area 20648$c$ (FIG. 990) which closes the window displayed in Windows Display Area 20148WDA (FIG. 984) when the corresponding software program is terminated. Referring to the present drawing, when a software program is terminated (S1), CPU 211 (FIG. 1) deletes the corresponding window data from Window Data Storage Area 20648$b$1 (FIG. 989) (S2). CPU 211 then closes the corresponding window displayed on Windows Display Area 20148WDA (FIG. 984) (S3) and erases the corresponding icon from Task Bar 20148TB (FIG. 984) (S4). CPU 211 updates the 'Priority Data' of the other windows accordingly, i.e., the 'Priority Data' of the other windows are shifted to the one rank higher one and stores the updated 'Priority Data' in Window Data Storage Area 20648$b$1 (S5).

FIG. 993 illustrates Window Size Changing Software 20648$c$3 stored in Multiple Window Displaying Software Storage Area 20648$c$ (FIG. 990) which changes the size of the window displayed in Windows Display Area 20148WDA (FIG. 984). Referring to the present drawing, a certain window is selected by utilizing Input Device 210 (FIG. 1) or via voice recognition system (S1). A window size changing signal which indicates to change the size of the window displayed in Windows Display Area 20148WDA is input in the same manner (S2). CPU 211 (FIG. 1), by identifying the information contained in the window size changing signal, updates and stores the renewed window data (with new 'Reference Point Data', 'Width Data', and 'Height Data') in Window Data Storage Area 20648$b$1 (FIG. 989) (S3). The window with the renewed size is displayed in Windows Display Area 20148WDA thereafter (S4).

FIG. 994 illustrates Window Size Minimizing Software 20648$c$4 stored in Multiple Window Displaying Software Storage Area 20648$c$ (FIG. 990) which minimizes the size of the window to zero displayed in Windows Display Area 20148WDA (FIG. 984). Referring to the present drawing, a certain window is selected by utilizing Input Device 210 (FIG. 1) or via voice recognition system (S1). A window size minimizing signal which indicates to minimize the size of the window displayed in Windows Display Area 20148WDA is input in the same manner (S2). The window data of the corresponding window remains unchanged except the 'Priority Data'. The 'Priority Data' of the minimized window is shifted to the lowest one (S3). CPU 211 (FIG. 1) updates the 'Priority Data' of the other windows accordingly, i.e., the 'Priority Data' of the other windows are shifted to the one rank higher one and stores the updated 'Priority Data' in Window Data Storage Area 20648$b$1 (FIG. 989) (S4). The size of the window displayed in Windows Display Area 20148WDA is minimized thereafter (S5).

FIG. 995 illustrates Window Size Restoring Software 20648$c$5 stored in Multiple Window Displaying Software Storage Area 20648$c$ (FIG. 990) which restores the size of the window minimized by Window Size Minimizing Software 20648$c$4 (FIG. 994) to its original size. Referring to the present drawing, a certain window is selected by utilizing Input Device 210 (FIG. 1) or via voice recognition system (S1). A window size restoring signal which indicates to restore the size of the window displayed in Windows Display Area 20148WDA is input in the same manner (S2). CPU 211 (FIG. 1), by identifying the information contained in the window size restoring signal, retrieves the window data (i.e., 'Reference Point Data', 'Width Data', and 'Height Data') from Window Data Storage Area 20648*b*1 (FIG. 989) (S3). CPU 211 sets the highest 'Priority Data' (i.e., 'Priority #1') for the restored window (S4), and stores the data in Window Data Storage Area 20648*b*1 (S4). CPU 211 further updates the 'Priority Data' of the other windows accordingly, i.e., the 'Priority Data' of the other windows are shifted to the one rank lower one and stores the updated 'Priority Data' in Window Data Storage Area 20648*b*1 (S5). The window size is restored thereafter (S6).

<<Multiple Window Displaying Function—Summary>>

(1) A communication device comprising a microphone, a speaker, a display, an input device and a multiple mode implementor, wherein said multiple mode implementor implements a voice communication mode and a multiple window displaying mode, a series of audio data are input to and output from said microphone and said speaker respectively when said voice communication mode is implemented, a multiple windows are displayed on said display when said multiple window displaying mode is implemented.

(2) A multiple window displaying software program which displays a multiple windows on a display of a communication device which implements a voice communication mode wherein a series of audio data are input to and output from a microphone and a speaker respectively of said communication mode in a wireless fashion when said voice communication mode is implemented.

<<Mouse Pointer Displaying Function>>

FIGS. 996 through 1021 illustrate the mouse pointer displaying function which displays on LCD 201 (FIG. 1) of Communication Device 200 a mouse pointer which is manipulated by the user of Communication Device 200. The mouse pointer is primarily utilized to select, open, close, drag & drop files, and its image is similar to the one displayed on ordinary personal computers.

FIG. 996 illustrates the storage area included in RAM 206 (FIG. 1). As described in the present drawing, RAM 206 includes Mouse Pointer Displaying Information Storage Area 20649*a* of which the data and the software programs stored therein are described in FIG. 997.

The data and software programs stored in Mouse Pointer Displaying Information Storage Area 20649*a* (FIG. 996) are downloaded from Host H (FIG. 429) in the manner described in FIGS. 401 through 407.

FIG. 997 illustrates the storage areas included in Mouse Pointer Displaying Information Storage Area 20649*a* (FIG. 996). As described in the present drawing, Mouse Pointer Displaying Information Storage Area 20649*a* includes Mouse Pointer Displaying Data Storage Area 20649*b* and Mouse Pointer Displaying Software Storage Area 20649*c*. Mouse Pointer Displaying Data Storage Area 20649*b* stores the data necessary to implement the present function, such as the ones described in FIGS. 998 through 1000. Mouse Pointer Displaying Software Storage Area 20649*c* stores the software programs necessary to implement the present function, such as the ones described in FIG. 1001.

FIG. 998 illustrates the storage areas included in Mouse Pointer Displaying Data Storage Area 20649*b* (FIG. 997). As described in the present drawing, Mouse Pointer Displaying Data Storage Area 20649*b* includes Mouse Pointer Image Data Storage Area 20649*b*1 and Current Pointer Data Storage Area 20649*b*2. Mouse Pointer Image Data Storage Area 20649*b*1 stores the data described in FIG. 999. Current Pointer Data Storage Area 20649*b*2 stores the data described in FIG. 1000.

FIG. 999 illustrates the data stored in Mouse Pointer Image Data Storage Area 20649*b*1 (FIG. 998). As described in the present drawing, Mouse Pointer Image Data Storage Area 20649*b*1 comprises two columns, i.e., 'Pointer ID' and 'Pointer Image Data'. Column 'Pointer ID' stores the pointer IDs, i.e., the identifications of the pointer image data stored in column 'Pointer Image Data', and column 'Pointer Image Data' stores the pointer image data designed to be displayed on LCD 201 (FIG. 1). The pointer image data stored in column 'Pointer Image Data' in the present example are the following: Pointer Image Data #1 which is a small white arrow, Pointer Image Data #2 which is a large white arrow, Pointer Image Data #3 which is a small black arrow, and Pointer Image Data #4 which is a large black arrow. Pointer #1 is the identification of Pointer Image Data #1, Pointer #2 is the identification of Pointer Image Data #2, Pointer #3 is the identification of Pointer Image Data #3, and Pointer #4 is the identification of Pointer Image Data #4.

FIG. 1000 illustrates the data stored in Current Pointer Data Storage Area 20649*b*2 (FIG. 998). As described in the present drawing, Current Pointer Data Storage Area 20649*b*2 comprises two columns, i.e., 'Selected Pointer ID' and 'Current Location Data'. 'Selected Pointer ID' stores the pointer IDs of the pointer image data selected in S3 of FIG. 1002. Column 'Current Location Data' stores the current location data which represents the location of the mouse pointer displayed on LCD 201 (FIG. 1). The current location data is stored in (x cm, y cm) format wherein 'x cm' represents the distance from the base point located on the upper left corner (not described in the drawing) of LCD 201 on x axis in centimeters, and 'y cm' represents the distance from the base point on y axis in centimeters. In the example described in the present drawing, the pointer ID 'Pointer #1' is stored in column 'Selected Pointer ID' and the current location data (2 cm, 3 cm) is stored in column 'Current Location Data'. Referring to FIG. 999, Pointer Image Data #1 (i.e., a small white arrow) of which the pointer ID is 'Pointer #1' is displayed on LCD 201 at the location of 2 cm from the base point on x axis and 3 cm from the base point on y axis.

FIG. 1001 illustrates the software programs stored in Mouse Pointer Displaying Software Storage Area 20649*c* (FIG. 997). As described in the present drawing, Mouse Pointer Displaying Software Storage Area 20649*c* stores Mouse Pointer Image Data Selecting Software 20649*c*1, Mouse Pointer Moving Software 20649*c*2, Mouse Pointer Displaying Software 20649*c*3, VRS Pointer Moving Signal Producing Software 20649*c*4, Keypad Pointer Moving Signal Producing Software 20649*c*5, Joystick Pointer Moving Signal Producing Software 20649*c*6, and ETS Pointer Moving Signal Producing Software 20649*c*7. Mouse Pointer Image Data Selecting Software 20649*c*1 is the software program described in FIG. 1002. Mouse Pointer Moving Software 20649*c*2 is the software program described in FIG. 1003. Mouse Pointer Displaying Software 20649*c*3 is the software program described in FIG. 1004. VRS Pointer Moving Signal Producing Software 20649*c*4 is the software program described in FIGS. 1005 through 1008. Keypad Pointer Moving Signal Producing Software 20649*c*5 is the software program described in FIGS. 1009 through 1012. Joystick Pointer Moving Signal Producing Software 20649*c*6 is the software program described in FIGS. 1013 through 1016. ETS Pointer Moving Signal Producing Software 20649*c*7 is the software program described in FIGS. 1017 through 1020.

FIG. 1002 illustrates Mouse Pointer Image Data Selecting Software 20649*c*1 stored in Mouse Pointer Displaying Software Storage Area 20649*c* (FIG. 1001) which selects the mouse pointer image data from a list displayed on LCD 201 (FIG. 1). Referring to the present drawing, CPU 211 (FIG. 1) retrieves all pointer image data from Mouse Pointer Image Data Storage Area 20649*b*1 (FIG. 999) (S1) and displays a list thereof on LCD 201 (S2). A mouse pointer image data is selected from the list by utilizing Input Device 210 (FIG. 1) or via voice recognition system (S3), and CPU 211 stores the corresponding pointer ID in column 'Selected Pointer ID' of Current Pointer Data Storage Area 20649*b*2 (FIG. 1000) (S4).

FIG. 1003 illustrates Mouse Pointer Moving Software 20649*c*2 stored in Mouse Pointer Displaying Software Storage Area 20649*c* (FIG. 1001) which updates the current location data stored in Current Pointer Data Storage Area 20649*b*2 (FIG. 1000) when mouse pointer moving signal is input. Referring to the present drawing, a mouse pointer moving signal indicating to move the mouse pointer displayed on LCD 201 (FIG. 1) to a new location is input by the method described hereinafter (S1). CPU 211 (FIG. 1) then calculates the new location where the mouse pointer is to be displayed (S2), and stores the new current location data in 'Current Location Data' of Current Pointer Data Storage Area 20649*b*2 (FIG. 1000) (S3).

FIG. 1004 illustrates Mouse Pointer Displaying Software 20649*c*3 stored in Mouse Pointer Displaying Software Storage Area 20649*c* (FIG. 1001) which displays the mouse pointer on LCD 201 (FIG. 1). Referring to the present drawing, CPU 211 (FIG. 1) retrieves the pointer ID from column 'Selected Pointer ID' of Current Pointer Data Storage Area 20649*b*2 (FIG. 1000) (S1). CPU 211 then retrieves the corresponding pointer image data from Mouse Pointer Image Data Storage Area 20649*b*1 (FIG. 999) (S2). CPU 211 further retrieves the current location data from column 'Current Location Data' of Current Pointer Data Storage Area 20649*b*2 (FIG. 1000) (S3). Based on the data retrieved in S1 through S3, CPU 211 displays the pointer image data on LCD 201 in accordance with the current location data (S4).

The software programs described in FIGS. 1003 and 1004 are repeated periodically, preferably sixty times every second.

FIG. 1005 illustrates VRS Pointer Moving Signal Producing Software 20649*c*4 stored in Mouse Pointer Displaying Software Storage Area 20649*c* (FIG. 1001) which produces the mouse pointer moving signal described in S1 of FIG. 1003 indicating to move up the mouse pointer by utilizing the voice recognition system described hereinbefore. Referring to the present drawing, a voice command 'move up' is input via Microphone 215 (FIG. 1) (S1). In response to the voice command, CPU 211 (FIG. 1) produces the mouse pointer moving signal indicating to move up the mouse pointer (S2).

FIG. 1006 illustrates VRS Pointer Moving Signal Producing Software 20649*c*4 stored in Mouse Pointer Displaying Software Storage Area 20649*c* (FIG. 1001) which produces the mouse pointer moving signal described in S1 of FIG. 1003 indicating to move down the mouse pointer by utilizing the voice recognition system described hereinbefore. Referring to the present drawing, a voice command 'move down' is input via Microphone 215 (FIG. 1) (S1). In response to the voice command, CPU 211 (FIG. 1) produces the mouse pointer moving signal indicating to move down the mouse pointer (S2).

FIG. 1007 illustrates VRS Pointer Moving Signal Producing Software 20649*c*4 stored in Mouse Pointer Displaying Software Storage Area 20649*c* (FIG. 1001) which produces the mouse pointer moving signal described in S1 of FIG. 1003 indicating to move left the mouse pointer by utilizing the voice recognition system described hereinbefore. Referring to the present drawing, a voice command 'move left' is input via Microphone 215 (FIG. 1) (S1). In response to the voice command, CPU 211 (FIG. 1) produces the mouse pointer moving signal indicating to move left the mouse pointer (S2).

FIG. 1008 illustrates VRS Pointer Moving Signal Producing Software 20649*c*4 stored in Mouse Pointer Displaying Software Storage Area 20649*c* (FIG. 1001) which produces the mouse pointer moving signal described in S1 of FIG. 1003 indicating to move right the mouse pointer by utilizing the voice recognition system described hereinbefore. Referring to the present drawing, a voice command 'move right' is input via Microphone 215 (FIG. 1) (S1). In response to the voice command, CPU 211 (FIG. 1) produces the mouse pointer moving signal indicating to move right the mouse pointer (S2).

FIG. 1009 illustrates Keypad Pointer Moving Signal Producing Software 20649*c*5 stored in Mouse Pointer Displaying Software Storage Area 20649*c* (FIG. 1001) which produces the mouse pointer moving signal described in S1 of FIG. 1003 indicating to move up the mouse pointer by utilizing the keypad, i.e., Numeric Data Input Device 21000*a* (FIG. 647). Referring to the present drawing, numeric data '8' is input via keypad, i.e., Numeric Data Input Device 21000*a* (FIG. 647) (S1). In response to the input numeric data, CPU 211 (FIG. 1) produces the mouse pointer moving signal indicating to move up the mouse pointer (S2).

FIG. 1010 illustrates Keypad Pointer Moving Signal Producing Software 20649*c*5 stored in Mouse Pointer Displaying Software Storage Area 20649*c* (FIG. 1001) which produces the mouse pointer moving signal described in S1 of FIG. 1003 indicating to move down the mouse pointer by utilizing the keypad, i.e., Numeric Data Input Device 21000*a* (FIG. 647). Referring to the present drawing, numeric data '2' is input via keypad, i.e., Numeric Data Input Device 21000*a* (FIG. 647) (S1). In response to the input numeric data, CPU 211 (FIG. 1) produces the mouse pointer moving signal indicating to move down the mouse pointer (S2).

FIG. 1011 illustrates Keypad Pointer Moving Signal Producing Software 20649*c*5 stored in Mouse Pointer Displaying Software Storage Area 20649*c* (FIG. 1001) which produces the mouse pointer moving signal described in S1 of FIG. 1003 indicating to move left the mouse pointer by utilizing the keypad, i.e., Numeric Data Input Device 21000*a* (FIG. 647). Referring to the present drawing, numeric data '4' is input via keypad, i.e., Numeric Data Input Device 21000*a* (FIG. 647) (S1). In response to the input numeric data, CPU 211 (FIG. 1) produces the mouse pointer moving signal indicating to move left the mouse pointer (S2).

FIG. 1012 illustrates Keypad Pointer Moving Signal Producing Software 20649*c*5 stored in Mouse Pointer Displaying Software Storage Area 20649*c* (FIG. 1001) which produces the mouse pointer moving signal described in S1 of FIG. 1003 indicating to move right the mouse pointer by utilizing the keypad, i.e., Numeric Data Input Device 21000*a* (FIG. 647). Referring to the present drawing, numeric data '6' is input via keypad, i.e., Numeric Data Input Device 21000*a* (FIG. 647) (S1). In response to the input numeric data, CPU 211 (FIG. 1) produces the mouse pointer moving signal indicating to move right the mouse pointer (S2).

FIG. 1013 illustrates Joystick Pointer Moving Signal Producing Software 20649*c*6 stored in Mouse Pointer Displaying Software Storage Area 20649*c* (FIG. 1001) which produces the mouse pointer moving signal described in S1 of FIG. 1003 indicating to move up the mouse pointer by utilizing Joystick 21000*d* (FIG. 646). Referring to the present drawing, Joystick 21000*d* is shifted up (S1). In response thereto, CPU 211 (FIG. 1) produces the mouse pointer moving signal indicating to move up the mouse pointer (S2).

FIG. 1014 illustrates Joystick Pointer Moving Signal Producing Software 20649*c*6 stored in Mouse Pointer Displaying Software Storage Area 20649*c* (FIG. 1001) which produces the mouse pointer moving signal described in S1 of FIG. 1003 indicating to move down the mouse pointer by utilizing Joystick 21000*d* (FIG. 646). Referring to the present drawing, Joystick 21000*d* is shifted down (S1). In response thereto, CPU 211 (FIG. 1) produces the mouse pointer moving signal indicating to move down the mouse pointer (S2).

FIG. 1015 illustrates Joystick Pointer Moving Signal Producing Software 20649*c*6 stored in Mouse Pointer Displaying Software Storage Area 20649*c* (FIG. 1001) which produces the mouse pointer moving signal described in S1 of FIG. 1003 indicating to move left the mouse pointer by utilizing Joystick 21000*d* (FIG. 646). Referring to the present drawing, Joystick 21000*d* is shifted left (S1). In response thereto, CPU 211 (FIG. 1) produces the mouse pointer moving signal indicating to move left the mouse pointer (S2).

FIG. 1016 illustrates Joystick Pointer Moving Signal Producing Software 20649*c*6 stored in Mouse Pointer Displaying Software Storage Area 20649*c* (FIG. 1001) which produces the mouse pointer moving signal described in S1 of FIG. 1003 indicating to move right the mouse pointer by utilizing Joystick 21000*d* (FIG. 646). Referring to the present drawing, Joystick 21000*d* is shifted right (S1). In response thereto, CPU 211 (FIG. 1) produces the mouse pointer moving signal indicating to move right the mouse pointer (S2).

FIG. 1017 illustrates ETS Pointer Moving Signal Producing Software 20649*c*7 stored in Mouse Pointer Displaying Software Storage Area 20649*c* (FIG. 1001) which produces the mouse pointer moving signal described in S1 of FIG. 1003 indicating to move up the mouse pointer by utilizing the eye tracking system. Here, the eye tracking system is a system to move the mouse pointer displayed on LCD 201 (FIG. 1) by utilizing the eye of the user of Communication Device 200. By utilizing this system, CPU 211 (FIG. 1) periodically monitors the movement of the eyes of the user of Communication Device 200, and the mouse pointer automatically moves to the location at which he/she is currently gazing. The mechanism of the eye tracking system is introduced in the following inventions and the references cited thereof: U.S. Pat. No. 6,459,446; U.S. Pat. No. 6,394,602; U.S. Pat. No. 6,381,339; U.S. Pat. No. 6,373,961; U.S. Pat. No. 6,359,601; U.S. Pat. No. 5,926,251; U.S. Pat. No. 5,861,940; U.S. Pat. No. 5,859,686; U.S. Pat. No. 5,638,176; U.S. Pat. No. 5,635,947; U.S. Pat. No. 5,583,335; U.S. Pat. No. 5,491,492; U.S. Pat. No. 5,481,622; U.S. Pat. No. 5,430,505; U.S. Pat. No. 5,410,376; U.S. Pat. No. 5,345,281; U.S. Pat. No. 5,331,149; U.S. Pat. No. 5,270,748; U.S. Pat. No. 5,231,674; and U.S. Pat. No. 4,376,309. The eye tracking system may be implemented by utilizing CCD Unit 214 (FIG. 1) or an eye tracking unit may be installed in Communication Device 200 to implement the system. For the avoidance of doubt, the eye tracking system may be implemented by either a hardware unit or a software program program.

Referring to the present drawing, the user of Communication Device 200 rolls up his/her eyes, which is detected by the eye tracking system (S1). CPU 211 (FIG. 1), in response thereto, produces the mouse pointer moving signal indicating to move up the mouse pointer (S2).

FIG. 1018 illustrates ETS Pointer Moving Signal Producing Software 20649*c*7 stored in Mouse Pointer Displaying Software Storage Area 20649*c* (FIG. 1001) which produces the mouse pointer moving signal described in S1 of FIG. 1003 indicating to move down the mouse pointer by utilizing the eye tracking system. Referring to the present drawing, the user of Communication Device 200 rolls down his/her eyes, which is detected by the eye tracking system (S1). CPU 211 (FIG. 1), in response thereto, produces the mouse pointer moving signal indicating to move down the mouse pointer (S2).

FIG. 1019 illustrates ETS Pointer Moving Signal Producing Software 20649*c*7 stored in Mouse Pointer Displaying Software Storage Area 20649*c* (FIG. 1001) which produces the mouse pointer moving signal described in S1 of FIG. 1003 indicating to move left the mouse pointer by utilizing the eye tracking system. Referring to the present drawing, the user of Communication Device 200 rolls left his/her eyes, which is detected by the eye tracking system (S1). CPU 211 (FIG. 1), in response thereto, produces the mouse pointer moving signal indicating to move left the mouse pointer (S2).

FIG. 1020 illustrates ETS Pointer Moving Signal Producing Software 20649*c*7 stored in Mouse Pointer Displaying Software Storage Area 20649*c* (FIG. 1001) which produces the mouse pointer moving signal described in S1 of FIG. 1003 indicating to move right the mouse pointer by utilizing the eye tracking system. Referring to the present drawing, the user of Communication Device 200 rolls right his/her eyes, which is detected by the eye tracking system (S1). CPU 211 (FIG. 1), in response thereto, produces the mouse pointer moving signal indicating to move right the mouse pointer (S2).

FIG. 1021 illustrates a different embodiment of Mouse Pointer Moving Software 20649*c*2 stored in Mouse Pointer Displaying Software Storage Area 20649*c* (FIG. 1001) which is executed in combination of eye tracking system explained hereinbefore. Referring to the present drawing, CPU 211 (FIG. 1), by utilizing the eye tracking system, determines the location on LCD 201 (FIG. 1) at which the user of Communication Device 200 is currently gazing (S1). CPU 211 then determines the new location where the mouse pointer is to be displayed (S2), and stores the new and updated current location data in 'Current Location Data' of Current Pointer Data Storage Area 20649*b*2 (FIG. 1000) (S3).

<<Mouse Pointer Displaying Function—Summary>>

(1) A communication device comprising a microphone, a speaker, a display, an input device and a multiple mode implementor, wherein said multiple mode implementor implements a voice communication mode and a mouse pointer displaying mode, a series of audio data are input to and output from said microphone and said speaker respectively when said voice communication mode is implemented, a mouse pointer which is manipulable by the user of said communication device is displayed on said display when said mouse pointer displaying mode is implemented.

(2) A mouse pointer displaying software program which displays a mouse pointer on a display of a communication device which implements a voice communication mode wherein said mouse pointer is manipulable by the user of said communication device and a series of audio data are input to and output from a microphone and a speaker respectively of said communication device in a wireless fashion when said voice communication mode is implemented.

(3) Said mouse pointer is manipulated by a voice recognition system.

(4) Said mouse pointer is manipulated by a keypad.

(5) Said mouse pointer is manipulated by a joystick.

(6) Said mouse pointer is manipulated by an eye tracking system.

<<House Item Pin-Pointing Function>>

FIGS. 1022 through 1152 illustrate the house item pin-pointing function which enables the user of Communication Device 200 to find the location of the house items for which he/she is looking in a house. Here, the house items are the tangible objects placed in a house which are movable by human being, such as a pair of glasses, a book, a pen, and a nail clipper. A small transmitter is attached to or embedded in a house item, and the location thereof is displayed on LCD 201 (FIG. 1) of Communication Device 200. For the avoidance of doubt, the present function is applicable for finding the locations of other items, such as LCD 201L (FIG. 467*b*), LCD 201R (FIG. 467*b*), Speaker 216L (FIG. 467*c*), and Speaker 216R (FIG. 467*c*) described hereinbefore.

FIG. 1022 illustrates the relationship between Glasses 50GL and Wireless Transmitter 50GLa. Glasses 50GL is a pair of glasses, and Wireless Transmitter 50GLa is a small wireless transmitter which respectively sends and receives wireless signals. As described in the present drawing, Wireless Transmitter 50GLa is attached to Glasses 50GL. As another embodiment, Wireless Transmitter 50GLa may be embedded in Glasses 50GL.

FIG. 1023 illustrates the relationship between Book 50BK and Wireless Transmitter 50BKa. Book 50BK is a book, and Wireless Transmitter 50BKa is a small wireless transmitter which respectively sends and receives wireless signals. As described in the present drawing, Wireless Transmitter 50BKa is attached to Book 50BK. As another embodiment, Wireless Transmitter 50BKa may be embedded in Book 50BK.

FIG. 1024 illustrates the relationship between Pen 50PN and Wireless Transmitter 50PNa. Pen 50PN is a pen, and Wireless Transmitter 50PNa is a small wireless transmitter which respectively sends and receives wireless signals. As described in the present drawing, Wireless Transmitter 50PNa is attached to Pen 50PN. As another embodiment, Wireless Transmitter 50PNa may be embedded in Pen 50PN.

FIG. 1025 illustrates the relationship between Nail Clipper 50NC and Wireless Transmitter 50NCa. Nail Clipper 50NC is a nail clipper, and Wireless Transmitter 50NCa is a small wireless transmitter which respectively sends and receives wireless signals. As described in the present drawing, Wireless Transmitter 50NCa is attached to Nail Clipper 50NC. As another embodiment, Wireless Transmitter 50NCa may be embedded in Nail Clipper 50NC.

FIG. 1026 illustrates the layout of House 50HS in which the house items described in FIGS. 1022 through 1025 are placed. House 50HS, in the present example, comprises four rooms, i.e., Room A, Room B, Room C, and Room D. As described in the present drawing, Glasses 50GL is placed in Room A, Book 50BK is placed in Room B, Pen 50PN is placed in Room C, and Nail Clipper 50NC is placed in Room D. Communication Device 200 is placed in Room A.

FIG. 1027 illustrates the relays which send and receive wireless signals installed in Room A (FIG. 1026). As described in the present drawing, four relays are installed in Room A, i.e., R50A1, R50A2, R50A3, and R50A4.

FIG. 1028 illustrates the relays which send and receive wireless signals installed in Room B (FIG. 1026). As described in the present drawing, four relays are installed in Room B, i.e., R50B1, R50B2, R50B3, and R50B4.

FIG. 1029 illustrates the relays which send and receive wireless signals installed in Room C (FIG. 1026). As described in the present drawing, four relays are installed in Room C, i.e., R50C1, R50C2, R50C3, and R50C4.

FIG. 1030 illustrates the relays which send and receive wireless signals installed in Room D (FIG. 1026). As described in the present drawing, four relays are installed in Room D, i.e., R50D1, R50D2, R50D3, and R50D4.

FIG. 1031 illustrates the relationship between Host H (FIG. 429) and the relays described in FIGS. 1027 through 1030. As described in the present drawing, Host H and the relays are connected via Network NT, such as the Internet.

FIG. 1032 illustrates another embodiment of the relationship between Host H (FIG. 429) and the relays described in FIGS. 1027 through 1030. As described in the present drawing, Host H and the relays are connected via Network NT, such as the Internet, and Sub-Host SH. Sub-Host SH transfers signals received from Host H to the relays and transfers signals received from the relays to Host H via Network NT. As another embodiment, Sub-Host SH may conduct all roles of Host H described hereinafter.

FIG. 1033 illustrates the layout of House 50HS (FIG. 1026) displayed on LCD 201 (FIG. 1). House 50HS displayed on LCD 201 is composed of four rooms, i.e., Room A, Room B, Room C, and Room D. As described in the present drawing, Room A is adjacent to Room B and C, Room B is adjacent to Room A and D, Room C is adjacent to Room A and D, and Room D is adjacent to Room B and C. Assuming that Glasses 50GL is placed in Room A, Book 50BK is placed in Room B, Pen 50PN is placed in Room C, Nail Clipper 50NC is placed in Room D, and Communication Device 200 is placed in Room A. As described in the present drawing, LCD 201 shows that Glasses 50GL is placed in Room A, Book 50BK is placed in Room B, Pen 50PN is placed in Room C, and Nail Clipper 50NC is placed in Room D. LCD 201 also shows that Communication Device 200 is placed in Room A.

FIG. 1034 illustrates Room A displayed on LCD 201 (FIG. 1). As described in the present drawing, LCD 201 shows that Glasses 50GL is placed in Room A and also the location thereof in Room A. LCD 201 also shows that Communication Device 200 is placed in Room A and also the location thereof in Room A.

FIG. 1035 illustrates Room B displayed on LCD 201 (FIG. 1). As described in the present drawing, LCD 201 shows that Book 50BK is placed in Room B and also the location thereof in Room B.

FIG. 1036 illustrates Room C displayed on LCD 201 (FIG. 1). As described in the present drawing, LCD 201 shows that Pen 50PN is placed in Room C and also the location thereof in Room C.

FIG. 1037 illustrates Room D displayed on LCD 201 (FIG. 1). As described in the present drawing, LCD 201 shows that Nail Clipper 50NC is placed in Room D and also the location thereof in Room D.

FIG. 1038 illustrates the storage area included in Host H (FIG. 429). As described in the present drawing, Host H includes House Item Pin-pointing Information Storage Area H50*a* of which the data and the software programs stored therein are described in 1039.

FIG. 1039 illustrates the storage areas included in House Item Pin-pointing Information Storage Area H50*a* (FIG. 1038). As described in the present drawing, House Item Pin-pointing Information Storage Area H50*a* includes House Item Pin-pointing Data Storage Area H50*b* and House Item Pin-pointing Software Storage Area H50*c*. House Item Pin-pointing Data Storage Area H50*b* stores the data necessary to implement the present function on the side of Host H (FIG. 429), such as the ones described in FIGS. 1040 through 1047. House Item Pin-pointing Software Storage Area H50*c* stores the software programs necessary to implement the present function on the side of Host H (FIG. 429), such as the ones described in FIG. 1048.

FIG. 1040 illustrates the storage areas included in House Item Pin-pointing Data Storage Area H50*b* (FIG. 1039). As described in the present drawing, House Item Pin-pointing Data Storage Area H50*b* includes House Data Storage Area H50*b*1, Work Area H50*b*2, Selected House Item ID Storage Area H50*b*3, and Selected Com. Device ID Storage Area H50*b*4. House Data Storage Area H50*b*1 is the storage area described in FIG. 1041. Work Area H50*b*2 is a storage area utilized for Host H (FIG. 429) to perform calculation and to temporarily store data. Selected House Item ID Storage Area H50*b*3 stores the identification of the house displayed on LCD 201 (FIG. 1) by implementing the present function. Selected Com. Device ID Storage Area H50*b*4 stores the identification of Communication Device 200 displayed on LCD 201 (FIG. 1) by implementing the present function.

FIG. 1041 illustrates the storage areas included in House Data Storage Area H50*b*1 (FIG. 1040). As described in the present drawing, House Data Storage Area H50*b*1 includes House#1 Data Storage Area H50*b*1*a*, House#2 Data Storage Area H50*b*1*b*, and House#3 Data Storage Area H50*b*1*c*. House#1 Data Storage Area H50*b*1*a* stores the house data of house #1. House#2 Data Storage Area H50*b*1*b* stores the house data of house #2. House#3 Data Storage Area H50*b*1*c* stores the house data of house #3. Here, houses #1 through #3 are the identifications of the houses of which the layouts and the rooms thereof, and the house items placed therein are displayed on LCD 201 (FIG. 1) by implementing the present function. The house data stored in each storage area are explained in FIG. 1042 by taking House#1 Data Storage Area H50*b*1*a* as an example.

FIG. 1042 illustrates the data stored in House#1 Data Storage Area H50*b*1*a* (FIG. 1041). House#1 Data Storage Area H50*b*1*a* stores the house data of house #1. As described in the present drawing, House#1 Data Storage Area H50*b*1*a* stores House Relay Location Data H50*b*1*a*1, Com. Device Location Data Storage Area H50*b*1*a*2, House Layout Data Storage Area H50*b*1*a*3, Room Layout Data Storage Area H50*b*1*a*4, House Item Icon Image Data Storage Area H50*b*1*a*5, and Com. Device Icon Image Data Storage Area H50*b*1*a*6. House Relay Location Data H50*b*1*a*1 is the data described in FIG. 1045. Com. Device Location Data Storage Area H50*b*1*a*2 stores the communication device location data representing the location of Communication Device 200. House Layout Data Storage Area H50*b*1*a*3 stores the data described in FIG. 1043. Room Layout Data Storage Area H50*b*1*a*4 stores the data described in FIG. 1044. House Item Icon Image Data Storage Area H50*b*1*a*5 stores the data described in FIG. 1046. Com. Device Icon Image Data Storage Area H50*b*1*a*6 stores the data described in FIG. 1047.

FIG. 1043 illustrates the house layout data stored in House Layout Data Storage Area H50*b*1*a*3 (FIG. 1042). House Layout Data Storage Area H50*b*1*a*3 stores the house layout data which represents the layout of house #1. Referring to the present drawing, the house layout data stored in House Layout Data Storage Area H50*b*1*a*3 represents the layout of House #1 which is composed of four rooms, i.e., Room A, Room B, Room C, and Room D. Room A is adjacent to Room B and C, Room B is adjacent to Room A and D, Room C is adjacent to Room A and D, and Room D is adjacent to Room B and C.

FIG. 1044 illustrates the room layout data stored in Room Layout Data Storage Area H50*b*1*a*4 (FIG. 1042). As described in the present drawing, Room Layout Data Storage Area H50*b*1*a*4 comprises two columns, i.e., "Room ID" and "Room Layout Data". Column "Room ID" stores the room IDs which are the identifications of the room layout data stored in column "Room Layout Data". Here, the room layout data is the data representing the layout of the room. In the example described in the present drawing, Column "Room Layout Data" stores the room layout data of each room included in house #1, i.e., Room A, Room B, Room C, and Room D. Referring to the present drawing, Room Layout Data Storage Area H50*b*1*a*4 (FIG. 1042) stores the following data: the room ID 'Room A' of which the room layout data is 'Room Layout Data 50RLD1'; the room ID 'Room B' of which the room layout data is 'Room Layout Data 50RLD2'; the room ID 'Room C' of which the room layout data is 'Room Layout Data 50RLD3'; and the room ID 'Room D' of which the room layout data is 'Room Layout Data 50RLD4'.

FIG. 1045 illustrates the data stored in House Relay Location Data H50*b*1*a*1 (FIG. 1042). As described in the present drawing, House Relay Location Data H50*b*1*a*1 comprises four columns, i.e., "House ID", "Room ID", "Relay ID", and "Relay Location Data". Column "House ID" stores the house ID which is the identification of house #1. Column "Room ID" stores the room IDs which are the identifications of the rooms included in house #1. Column "Relay ID" stores the relay IDs which are the identifications of the relays installed in each room. Column "Relay Location Data" stores the relay location data which represents the location of each relay. In the example described in the present drawing, the relay IDs R50A1 through R50A4 installed in Room A are stored in column 'Relay ID' of which the corresponding relay location data are stored in column "Relay Location Data" in (x, y, z) format; the relay IDs R50B1 through R50B4 installed in Room B are stored in column 'Relay ID' of which the corresponding relay location data are stored in column "Relay Location Data" in (x, y, z) format; the relay IDs R50C1 through R50C4 installed in Room C are stored in column 'Relay ID' of which the corresponding relay location data are stored in column "Relay Location Data" in (x, y, z) format; and the relay IDs R50D1 through R50D4 installed in Room D are stored in column 'Relay ID' of which the corresponding relay location data are stored in column "Relay Location Data" in (x, y, z) format.

FIG. 1046 illustrates the data stored in House Item Icon Image Data Storage Area H50*b*1*a*5 (FIG. 1042). As described in the present drawing, House Item Icon Image Data Storage Area H50*b*1*a*5 comprises three columns, i.e., "House Item ID", "House Item Icon Image Data", and "House Item Name Data". Column "House Item ID" stores the house item IDs which represent the identifications of the house items, such as Glasses 50GL (FIG. 1022), Book 50BK (FIG. 1023), Pen 50PN (FIG. 1024), and Nail Clipper 50NC (FIG. 1025). Here, the house items are the tangible objects placed in a house (house #1 in the present example) which are movable by human being. Column "House Item Icon Image Data" stores the house item icon image data which are the image data of the icons designed to be displayed on LCD 201 (FIG. 1) representing the house items. Column "House Item Name Data" stores the house item name data which are text data designed to be displayed on LCD 201 (FIG. 1) representing the name of the house items. In the example described in the present drawing, House Item Icon Image Data Storage Area H50*b*1*a*5 (FIG. 1042) stores the following data: the house item ID 'House Item #1' of which the house item ID and the house item name data are 'House Item Icon Image Data #1' and 'Glasses' respectively, wherein 'Glasses' represents Glasses 50GL (FIG. 1022); the house item ID 'House Item #2' of which the house item ID and the house item name data are 'House Item Icon Image Data #2' and 'Book' respectively, wherein 'Book' represents Book 50BK (FIG. 1023); the house item ID 'House Item #3' of which the house item ID and the house item name data are 'House Item Icon Image Data #3' and 'Pen' respectively, wherein 'Pen' represents Pen 50PN (FIG. 1024); and the house item ID 'House Item #4' of which the house item ID and the house item name data are 'House Item Icon Image Data #4' and 'Nail Clipper' respectively, wherein 'Nail Clipper' represents Nail Clipper 50NC (FIG. 1025).

FIG. 1047 illustrates the data stored in Com. Device Icon Image Data Storage Area H50*b*1*a*6 (FIG. 1042). As described in the present drawing, Com. Device Icon Image Data Storage Area H50*b*1*a*6 comprises three columns, i.e., "Com. Device ID", "Com. Device Icon Image Data", and "User Name Data". Column "Com. Device ID" stores the communication device IDs which represent the identifications of Communication Devices 200. Column "Com. Device Icon Image Data" stores the communication device icon image data which are the image data of the icons designed to be displayed on LCD 201 (FIG. 1) representing Communication Devices 200. Column "User Name Data" stores the user name data which are text data designed to be displayed on LCD 201 (FIG. 1) representing the name of the users of Communication Devices 200. In the example described in the present drawing, Com. Device Icon Image Data Storage Area H50*b*1*a*6 stores the following data: the communication device ID 'Com. Device #1' of which the communication device icon image data and the user name data are 'Com. Device Icon Image Data #1' and 'User Name #1' respectively; the communication device ID 'Com. Device #2' of which the communication device icon image data and the user name data are 'Com. Device Icon Image Data #2' and 'User Name #2' respectively; and the communication device ID 'Com. Device #3' of which the communication device icon image data and the user name data are 'Com. Device Icon Image Data #3' and 'User Name #3' respectively.

FIG. 1048 illustrates the software programs stored in House Item Pin-pointing Software Storage Area H50*c* (FIG. 1039). As described in the present drawing, House Item Pin-pointing Software Storage Area H50*c* stores House Layout Data Requesting Software H50*c*1, House Layout Data Sending/Receiving Software H50*c*2, Room Layout Data Requesting Software H50*c*4, Room Layout Data Sending/Receiving Software H50*c*5, House Item List Displaying Software H50*c*6*a*, Selected House Item ID Sending/Receiving Software H50*c*8, Selected House Item Finding Software H50*c*9, Selected House Item Locating Software H50*c*10, Calculated GPS Data Sending/Receiving Software H50*c*11, Com. Device List Displaying Software H50*c*12*a*, Selected Com. Device ID Sending/Receiving Software H50*c*14, Selected Com. Device Finding Software H50*c*15, Selected Com. Device Locating Software H50*c*16, and Calculated GPS Data Sending/Receiving Software H50*c*17. House Layout Data Requesting Software H50*c*1 is the software program described in FIG. 1060. House Layout Data Sending/Receiving Software H50*c*2 is the software program described in FIG. 1062. Room Layout Data Requesting Software H50*c*4 is the software program described in FIG. 1064. Room Layout Data Sending/Receiving Software H50*c*5 is the software program described in FIG. 1066. House Item List Displaying Software H50*c*6*a* is the software program described in FIG. 1068. Selected House Item ID Sending/Receiving Software H50*c*8 is the software program described in FIG. 1070. Selected House Item Finding Software H50*c*9 is the software program described in FIG. 1071. Selected House Item Locating Software H50*c*10 is the software program described in FIG. 1072. Calculated GPS Data Sending/Receiving Software H50*c*11 is the software program described in FIG. 1073. Com. Device List Displaying Software H50*c*12*a* is the software program described in FIG. 1075. Selected Com. Device ID Sending/Receiving Software H50*c*14 is the software program described in FIG. 1077. Selected Com. Device Finding Software H50*c*15 is the software program described in FIG. 1078. Selected Com. Device Locating Software H50*c*16 is the software program described in FIG. 1079. Calculated GPS Data Sending/Receiving Software H50*c*17 is the software program described in FIG. 1080.

FIG. 1049 illustrates the storage area included in RAM 206 (FIG. 1) of Communication Device 200. As described in the present drawing, RAM 206 includes House Item Pin-pointing Information Storage Area 20650*a* of which the data and the software programs stored therein are described in 1050.

The data and software programs stored in House Item Pin-pointing Information Storage Area 20650*a* (FIG. 1049) are downloaded from Host H (FIG. 429) in the manner described in FIGS. 401 through 407.

FIG. 1050 illustrates the storage areas included in House Item Pin-pointing Information Storage Area 20650*a* (FIG. 1049). As described in the present drawing, House Item Pin-pointing Information Storage Area 20650*a* includes House Item Pin-pointing Data Storage Area 20650*b* and House Item Pin-pointing Software Storage Area 20650*c*. House Item Pin-pointing Data Storage Area 20650*b* stores the data necessary to implement the present function on the side of Communication Device 200, such as the ones described in FIGS. 1051 through 1058. House Item Pin-pointing Software Storage Area 20650*c* stores the software programs necessary to implement the present function on the side of Communication Device 200, such as the ones described in FIG. 1059.

FIG. 1051 illustrates the storage areas included in House Item Pin-pointing Data Storage Area 20650*b* (FIG. 1050). As described in the present drawing, House Item Pin-pointing Data Storage Area 20650*b* includes House Data Storage Area 20650*b*1, Work Area 20650*b*2, Selected House Item ID Storage Area 20650*b*3, and Selected Com. Device ID Storage Area 20650*b*4. House Data Storage Area 20650*b*1 is the storage area described in FIG. 1052. Work Area 20650*b*2 is a storage area utilized for CPU 211 (FIG. 1) to perform calculations and to temporarily store data. Selected House Item ID Storage Area 20650*b*3 stores the identification of the house displayed on LCD 201 (FIG. 1) by implementing the present function. Selected Com. Device ID Storage Area 20650*b*4 stores the identification of Communication Device 200 displayed on LCD 201 (FIG. 1) by implementing the present function.

FIG. 1052 illustrates the storage areas included in House Data Storage Area 20650*b*1 (FIG. 1051). As described in the present drawing, House Data Storage Area 20650*b*1 includes House#1 Data Storage Area 20650*b*1*a*. House#1 Data Storage Area 20650*b*1*a* stores the house data of house #1. Here, house #1 is the identification of the house of which the layout and the rooms thereof, and the house items placed therein are displayed on LCD 201 (FIG. 1) by implementing the present function. The house data stored in House#1 Data Storage Area 20650*b*1*a* are explained in FIG. 1053.

FIG. 1053 illustrates the data stored in House#1 Data Storage Area 20650*b*1*a* (FIG. 1052). House#1 Data Storage Area 20650*b*1*a* stores the house data of house #1. As described in the present drawing, House#1 Data Storage Area 20650*b*1*a* stores House Relay Location Data 20650*b*1*a*1, Com. Device Location Data Storage Area 20650*b*1*a*2, House Layout Data Storage Area 20650*b*1*a*3, Room Layout Data Storage Area 20650*b*1*a*4, House Item Icon Image Data Storage Area 20650*b*1*a*5, and Com. Device Icon Image Data Storage Area 20650*b*1*a*6. House Relay Location Data 20650*b*1*a*1 is the data described in FIG. 1056. Com. Device Location Data Storage Area 20650*b*1*a*2 stores the communication device location data representing the location of Communication Device 200. House Layout Data Storage Area 20650*b*1*a*3 stores the data described in FIG. 1054. Room Layout Data Storage Area **20650*b*1*a*4 stores the data described in FIG. 1055. House Item Icon Image Data Storage Area 20650*b*1*a*5 stores the data described in FIG. 1057. Com. Device Icon Image Data Storage Area 20650*b*1*a*6 stores the data described in FIG. 1058**.

FIG. 1054 illustrates the house layout data stored in House Layout Data Storage Area **20650*b*1*a*3 (FIG. 1053). House Layout Data Storage Area 20650*b*1*a*3 stores the house layout data which represents the layout of House #1. Referring to the present drawing, the house layout data stored in House Layout Data Storage Area 20650*b*1*a*3 represents the layout of House #1** which is composed of four rooms, i.e., Room A, Room B, Room C, and Room D. Room A is adjacent to Room B and C, Room B is adjacent to Room A and D, Room C is adjacent to Room A and D, and Room D is adjacent to Room B and C.

FIG. 1055 illustrates the room layout data stored in Room Layout Data Storage Area **20650*b*1*a*4 (FIG. 1053). As described in the present drawing, Room Layout Data Storage Area 20650*b*1*a*4 comprises two columns, i.e., "Room ID" and "Room Layout Data". Column "Room ID" stores the room IDs which are the identifications of the room layout data stored in column "Room Layout Data". Column "Room Layout Data" stores the room layout data of each room included in house #1, i.e., Room A, Room B, Room C, and Room D. Here, the room layout data is the data representing the layout of the room. In the example described in the present drawing, Room Layout Data Storage Area 20650*b*1*a*4 (FIG. 1042) stores the following data: the room ID 'Room A' of which the room layout data is 'Room Layout Data 50RLD1'; the room ID 'Room B' of which the room layout data is 'Room Layout Data 50RLD2'; the room ID 'Room C' of which the room layout data is 'Room Layout Data 50RLD3'; and the room ID 'Room D' of which the room layout data is 'Room Layout Data 50RLD4**'.

FIG. 1056 illustrates the data stored in House Relay Location Data **20650*b*1*a*1 (FIG. 1053). As described in the present drawing, House Relay Location Data 20650*b*1*a*1 comprises four columns, i.e., "House ID", "Room ID", "Relay ID", and "Relay Location Data". Column "House ID" stores the house ID which is the identification of house #1. Column "Room ID" stores the room IDs which are the identifications of the rooms included in house #1. Column "Relay ID" stores the relay IDs which are the identifications of the relays installed in each room. Column "Relay Location Data" stores the relay location data which represents the location of each relay. In the example described in the present drawing, the relay IDs R50A1 through R50A4 installed in Room A are stored in column 'Relay ID' of which the corresponding relay location data are stored in column "Relay Location Data" in (x, y, z) format; the relay IDs R50B1 through R50B4 installed in Room B are stored in column 'Relay ID' of which the corresponding relay location data are stored in column "Relay Location Data" in (x, y, z) format; the relay IDs R50C1 through R50C4 installed in Room C are stored in column 'Relay ID' of which the corresponding relay location data are stored in column "Relay Location Data" in (x, y, z) format; and the relay IDs R50D1 through R50D4** installed in Room D are stored in column 'Relay ID' of which the corresponding relay location data are stored in column "Relay Location Data" in (x, y, z) format.

FIG. 1057 illustrates the data stored in House Item Icon Image Data Storage Area **20650*b*1*a*5 (FIG. 1053). As described in the present drawing, House Item Icon Image Data Storage Area 20650*b*1*a*5 comprises three columns, i.e., "House Item ID", "House Item Icon Image Data", and "House Item Name Data". Column "House Item ID" stores the house item IDs which represent the identifications of the house items, such as Glasses 50GL, Book 50BK, and Pen 50PN. Here, the house items are the tangible objects placed in a house (house #1 in the present example) which are movable by human being. Column "House Item Icon Image Data" stores the house item icon image data which are image data of the icons designed to be displayed on LCD 201 (FIG. 1) representing the house items. Column "House Item Name Data" stores the house item name data which are text data designed to be displayed on LCD 201 (FIG. 1) representing the name of the house items. In the example described in the present drawing, House Item Icon Image Data Storage Area 20650*b*1*a*5 stores the following data: the house item ID 'House Item #1' of which the house item ID and the house item name data are 'House Item Icon Image Data #1' and 'Glasses' respectively, wherein 'Glasses' represents Glasses 50GL (FIG. 1022); the house item ID 'House Item #2' of which the house item ID and the house item name data are 'House Item Icon Image Data #2' and 'Book' respectively, wherein 'Book' represents Book 50BK (FIG. 1023); the house item ID 'House Item #3' of which the house item ID and the house item name data are 'House Item Icon Image Data #3' and 'Pen' respectively, wherein 'Pen' represents Pen 50PN (FIG. 1024); and the house item ID 'House Item #4' of which the house item ID and the house item name data are 'House Item Icon Image Data #4' and 'Nail Clipper' respectively, wherein 'Nail Clipper' represents Nail Clipper 50NC (FIG. 1025**).

FIG. 1058 illustrates the data stored in Com. Device Icon Image Data Storage Area **20650*b*1*a*6 (FIG. 1053). As described in the present drawing, Com. Device Icon Image Data Storage Area 20650*b*1*a*6 comprises three columns, i.e., "Com. Device ID", "Com. Device Icon Image Data", and "User Name Data". Column "Com. Device ID" stores the communication device IDs which represent the identifications of Communication Devices 200. Column "Com. Device Icon Image Data" stores the communication device icon image data which are the image data of the icons designed to be displayed on LCD 201 (FIG. 1) representing Communication Devices 200. Column "User Name Data" stores the user name data which are text data designed to be displayed on LCD 201 (FIG. 1) representing the names of the users of Communication Devices 200. In the example described in the present drawing, Com. Device Icon Image Data Storage Area 20650*b*1*a*6 stores the following data: the communication device ID 'Com. Device #1' of which the communication device icon image data and the user name data are 'Com. Device Icon Image Data #1' and 'User Name #1' respectively; the communication device ID 'Com. Device #2' of which the communication device icon image data and the user name data are 'Com. Device Icon Image Data #2' and 'User Name #2' respectively; and the communication device ID 'Com. Device #3' of which the communication device icon image data and the user name data are 'Com. Device Icon Image Data #3' and 'User Name #3**' respectively.

FIG. 1059 illustrates the software programs stored in House Item Pin-pointing Software Storage Area **20650*c* (FIG. 1050). As described in the present drawing, House Item Pin-pointing Software Storage Area 20650*c* stores House Layout Data Requesting Software 20650*c*1, House Layout Data Sending/Receiving Software 20650*c*2, House Layout Data Displaying Software 20650*c*3, Room Layout Data Requesting Software 20650*c*4, Room Layout Data Sending/Receiving Software 20650*c*5, Room Layout Data Displaying Software 20650*c*6, House Item List Displaying Software 20650*c*6*a*, House Item Selecting Software 20650*c*7, Selected House Item ID Sending/Receiving Software 20650*c*8, Calculated GPS Data Sending/Receiving Software 20650*c*11, Selected House Item Displaying Software 20650*c*12, Com. Device List Displaying Software 20650*c*12***a*, Com. Device Selecting Software 20650*c*13, Selected Com. Device ID Sending/Receiving Software 20650*c*14, Calculated GPS Data Sending/Receiving Software 20650*c*17, and Selected Com. Device Displaying Software 20650*c*18. House Layout Data Requesting Software 20650*c*1 is the software program described in FIG. 1060. House Layout Data Sending/Receiving Software 20650*c*2 is the software program described in FIG. 1062. House Layout Data Displaying Software 20650*c*3 is the software program described in FIG. 1063. Room Layout Data Requesting Software 20650*c*4 is the software program described in FIG. 1064. Room Layout Data Sending/Receiving Software 20650*c*5 is the software program described in FIG. 1066. Room Layout Data Displaying Software 20650*c*6 is the software program described in FIG. 1067. House Item List Displaying Software 20650*c*6*a* is the software program described in FIG. 1068. House Item Selecting Software 20650*c*7 is the software program described in FIG. 1069. Selected House Item ID Sending/Receiving Software 20650*c*8 is the software program described in FIG. 1070. Calculated GPS Data Sending/Receiving Software 20650*c*11 is the software program described in FIG. 1073. Selected House Item Displaying Software 20650*c*12 is the software program described in FIG. 1074. Com. Device List Displaying Software 20650*c*12*a* is the software program described in FIG. 1075. Com. Device Selecting Software 20650*c*13 is the software program described in FIG. 1076. Selected Com. Device ID Sending/Receiving Software 20650*c*14 is the software program described in FIG. 1077. Calculated GPS Data Sending/Receiving Software 20650*c*17 is the software program described in FIG. 1080. Selected Com. Device Displaying Software 20650*c*18 is the software program described in FIG. 1081.

FIGS. 1060 through 1063 illustrate the method to display a house layout on LCD 201 (FIG. 1) of Communication Device 200.

FIG. 1060 illustrates House Layout Data Requesting Software H50*c*1 stored in House Item Pin-pointing Software Storage Area H50*c* (FIG. 1048) of Host H (FIG. 429) and House Layout Data Sending/Receiving Software 20650*c*2 stored in House Item Pin-pointing Software Storage Area 20650*c* (FIG. 1059) of Communication Device 200, which respectively sends and receives a house layout data request. Referring to the present drawing, CPU 211 (FIG. 1) of Communication Device 200 sends a house layout data request 50HLDR (S1), which is received by Host H (S2). Here, the house layout data request 50HLDR is a request signal described in FIG. 1061.

FIG. 1061 illustrates the data included in House Layout Data Request 50HLDR described in FIG. 1060. As described in the present drawing, House Layout Data Request 50HLDR includes Request Signal 50HLDRa and House ID 50HLDRb. Request Signal 50HLDRa is a signal requesting to send to Communication Device 200 a house layout data which is the data representing the layout of the house identified by House ID 50HLDRb. House ID 50HLDRb is the house ID representing the identification of a house (house #1 in the present example) of which the layout is to be displayed on LCD 201 (FIG. 1) of Communication Device 200.

FIG. 1062 illustrates House Layout Data Sending/Receiving Software H50*c*2 stored in House Item Pin-pointing Software Storage Area H50*c* (FIG. 1048) of Host H (FIG. 429) and House Layout Data Sending/Receiving Software 20650*c*2 stored in House Item Pin-pointing Software Storage Area 20650*c* (FIG. 1059) of Communication Device 200, which respectively sends and receives a house layout data. Referring to the present drawing, Host H retrieves the house ID from House Layout Data Request 50HLDR (FIG. 1061) (S1) and identifies the house data stored in House Data Storage Area H50*b*1 (FIG. 1040) (in the present example, House#1 Data Storage Area H50*b*1*a* is selected) (S2). Host H then retrieves the house layout data from House Layout Data Storage Area H50*b*1*a*3 (FIG. 1042) (S3), and sends the data to Communication Device 200 (S4). CPU 211 (FIG. 1) of Communication Device 200 receives the house layout data (S5), and stores the data in House Layout Data Storage Area 20650*b*1*a*3 (FIG. 1053) (S6).

FIG. 1063 illustrates House Layout Data Displaying Software 20650*c*3 stored in House Item Pin-pointing Software Storage Area 20650*c* (FIG. 1059) of Communication Device 200, which displays house layout data on LCD 201 (FIG. 1) of Communication Device 200. Referring to the present drawing, CPU 211 (FIG. 1) of Communication Device 200 retrieves the house layout data from House Layout Data Storage Area 20650*b*1*a*3 (FIG. 1053) (S1), and displays the data on LCD 201 (FIG. 1) (S2).

FIGS. 1064 through 1067 illustrate the method to display a room layout on LCD 201 (FIG. 1) of Communication Device 200.

FIG. 1064 illustrates Room Layout Data Requesting Software H50*c*4 stored in House Item Pin-pointing Software Storage Area H50*c* (FIG. 1048) of Host H (FIG. 429) and Room Layout Data Requesting Software 20650*c*4 stored in House Item Pin-pointing Software Storage Area 20650*c* (FIG. 1059) of Communication Device 200, which respectively sends and receives a room layout data request. Referring to the present drawing, a room of which the layout is to be displayed on LCD 201 (FIG. 1) is selected by utilizing Input Device 210 (FIG. 1) or via voice recognition system (S1). CPU 211 (FIG. 1) sends a room layout data request 50RLDR (S1), which is received by Host H (S2). Here, the room layout data request 50RLDR is a request signal described in FIG. 1065.

FIG. 1065 illustrates the data included in Room Layout Data Request 50RLDR described in FIG. 1064. As described in the present drawing, Room Layout Data Request 50RLDR includes Request Signal 50RLDRa, House ID 50RLDRb, and Room ID 50RLDRc. Request Signal 50RLDRa is a signal requesting to send to Communication Device 200 a room layout data which is the data representing the layout of the room identified by House ID 50RLDRb and Room ID 50RLDRc. House ID 50RLDRb is the house ID representing the identification of a house (house #1 in the present example). Room ID 50RLDRc is the room ID representing the identification of a room (Room A in the present example) of which the layout is to be displayed on LCD 201 (FIG. 1) of Communication Device 200.

FIG. 1066 illustrates Room Layout Data Sending/Receiving Software H50*c*5 stored in House Item Pin-pointing Software Storage Area H50*c* (FIG. 1048) of Host H (FIG. 429) and Room Layout Data Sending/Receiving Software 20650*c*5 stored in House Item Pin-pointing Software Storage Area 20650*c* (FIG. 1059) of Communication Device 200, which respectively sends and receives a room layout data. Referring to the present drawing, Host H retrieves the house ID and the room ID from Room Layout Data Request 50RLDR (S1), and identifies the house data stored in House Data Storage Area H50*b*1 (FIG. 1040) (house #1 in the present example) (S2). Host H then identifies the room layout data stored in Room Layout Data Storage Area H50*b*1*a*4 (FIG. 1042) (S3), and retrieves the data from Room Layout Data Storage Area H50*b*1*a*4 (FIG. 1042) (S4). The room layout data is sent from Host H (S5), and is received by Communication Device 200 (S6). CPU 211 (FIG. 1) of Communication Device 200 stores the room layout data in Room Layout Data Storage Area 20650*b*1*a*4 (FIG. 1053) (S7).

FIG. 1067 illustrates Room Layout Data Displaying Software 20650*c*6 stored in House Item Pin-pointing Software Storage Area 20650*c* (FIG. 1059) of Communication Device 200, which displays room layout data on LCD 201 (FIG. 1) of Communication Device 200. Referring to the present drawing, CPU 211 (FIG. 1) of Communication Device 200 retrieves the room layout data from Room Layout Data Storage Area 20650*b*1*a*4 (FIG. 1053) (S1) and displays the data on LCD 201 (FIG. 1) (S2).

FIGS. 1068 through 1074 illustrate the method to display the house item icons on LCD 201 (FIG. 1) of Communication Device 200.

FIG. 1068 illustrates House Item List Displaying Software H50*c*6*a* stored in House Item Pin-pointing Software Storage Area H50*c* (FIG. 1048) of Host H (FIG. 429) and House Item List Displaying Software 20650*c*6*a* stored in House Item Pin-pointing Software Storage Area 20650*c* (FIG. 1059) of Communication Device 200, which displays a house item list on LCD 201 (FIG. 1) of Communication Device 200. Referring to the present drawing, Communication Device 200 sends a request for the house item IDs, the house item icon image data, and the house item name data (S1), and Host H receives the request (S2). Host H then retrieves the house item IDs, the house item icon image data, and the house item name data from House Item Icon Image Data Storage Area H50*b*1*a*5 (FIG. 1042) (S3), and sends these data to Communication Device 200 (S4). Upon receiving the house item IDs, the house item icon image data, and the house item name data (S5), CPU 211 (FIG. 1) of Communication Device 200 stores these data in House Item Icon Image Data Storage Area 20650*b*1*a*5 (FIG. 1053) (S6). CPU 211 then retrieves the house item IDs, the house item icon image data, and the house item name data from House Item Icon Image Data Storage Area 20650*b*1*a*5 (FIG. 1053) (S7), and displays on LCD 201 (FIG. 1) a list of the house items including these data (S8).

FIG. 1069 illustrates House Item Selecting Software 20650*c*7 stored in House Item Pin-pointing Software Storage Area 20650*c* (FIG. 1059) of Communication Device 200, which selects a house item from the house item list displayed on LCD 201 (FIG. 1) of Communication Device 200. Referring to the present drawing, a house item which is to be located by implementing the present function is selected from the list displayed in S8 of FIG. 1068 by utilizing Input Device 210 (FIG. 1) or via voice recognition system (S1). CPU 211 (FIG. 1) then stores the selected house item ID in Selected House Item ID Storage Area 20650*b*3 (FIG. 1051) (S2).

FIG. 1070 illustrates Selected House Item ID Sending/Receiving Software H50*c*8 stored in House Item Pin-pointing Software Storage Area H50*c* (FIG. 1048) of Host H (FIG. 429) and Selected House Item ID Sending/Receiving Software 20650*c*8 stored in House Item Pin-pointing Software Storage Area 20650*c* (FIG. 1059) of Communication Device 200, which respectively sends and receives house item ID selected by House Item Selecting Software 20650*c*7 described in FIG. 1069. Referring to the present drawing, CPU 211 (FIG. 1) of Communication Device 200 retrieves the selected house item ID from Selected House Item ID Storage Area 20650*b*3 (FIG. 1051) (S1). CPU 211 sends the selected house item ID (S2), which is received by Host H (S3). Host H then stores the selected house item ID in Selected House Item ID Storage Area H50*b*3 (FIG. 1040) (S4).

FIG. 1071 illustrates Selected House Item Finding Software H50*c*9 stored in House Item Pin-pointing Software Storage Area H50*c* (FIG. 1048) of Host H (FIG. 429), which finds the house item selected by House Item Selecting Software 20650*c*7 described in FIG. 1069. Referring to the present drawing, Host H receives the ID signals from all house items via relays described in FIGS. 1027 through 1030 (S1). Here, the ID signals are the signals emitted from the relays representing their identifications. Host H then detects the selected house item (S2), and identifies the room ID of the room in which the selected house item is located (S3).

FIG. 1072 illustrates Selected House Item Locating Software H50*c*10 stored in House Item Pin-pointing Software Storage Area H50*c* (FIG. 1048) of Host H (FIG. 429), which locates the house item selected House Item Selecting Software 20650*c*7 described in FIG. 1069. Referring to the present drawing, Host H retrieves the row GPS data 50RGD from the relays in the room identified in S3 of FIG. 1071 (S1). The row GPS data 50RGD is stored in Work Area H50*b*2 (FIG. 1040) (S2). Host H then calculates the row GPS data 50RGD in Work Area H50*b*2 (FIG. 1040) to produce the calculated GPS data (S3), which is stored in Work Area H50*b*2 (FIG. 1040) (S4). Here, the row GPS data 50RGD is a primitive data utilized to produce the calculated GPS data, and the calculated GPS data is the data representing the location in (x, y, z) format.

FIG. 1073 illustrates Calculated GPS Data Sending/Receiving Software H50*c*11 stored in House Item Pin-pointing Software Storage Area H50*c* (FIG. 1048) of Host H (FIG. 429) and Calculated GPS Data Sending/Receiving Software 20650*c*11 stored in House Item Pin-pointing Software Storage Area 20650*c* (FIG. 1059) of Communication Device 200, which respectively sends and receives the calculated GPS data produced by Selected House Item Locating Software H50*c*10 described in FIG. 1072. Referring to the present drawing, Host H retrieves the calculated GPS Data from Work Area H50*b*2 (FIG. 1040) (S1), and sends the data to Communication Device 200 (S2). CPU 211 (FIG. 1) of Communication Device 200 receives the calculated GPS Data from Host H (S3), and stores the data in Work Area 20650*b*2 (FIG. 1051) (S4).

FIG. 1074 illustrates Selected House Item Displaying Software 20650*c*12 stored in House Item Pin-pointing Software Storage Area 20650*c* (FIG. 1059) of Communication Device 200, which displays the location of the house item selected by House Item Selecting Software 20650*c*7 described in FIG. 1069. Referring to the present drawing, CPU 211 (FIG. 1) of Communication Device 200 retrieves the calculated GPS Data from Work Area 20650*b*2 (FIG. 1051) (S1) and further retrieves the house item icon image data from House Item Icon Image Data Storage Area 20650*b*1*a*5 (FIG. 1053) by referring to the selected house item ID stored in Selected House Item ID Storage Area 20650*b*3 (FIG. 1051) (S2). CPU 211 then displays the house item icon image data on LCD 201 (FIG. 1) at the location corresponding to the calculated GPS data stored in S4 of FIG. 1073 (S3).

FIGS. 1075 through 1081 illustrate the method to display the communication device icons on LCD 201 (FIG. 1) of Communication Device 200.

FIG. 1075 illustrates Com. Device List Displaying Software H50*c*12*a* stored in House Item Pin-pointing Software Storage Area H50*c* (FIG. 1048) of Host H (FIG. 429) and Com. Device List Displaying Software 20650*c*12*a* stored in House Item Pin-pointing Software Storage Area 20650*c* (FIG. 1059) of Communication Device 200, which displays a communication device list (a list of communication devices) on LCD 201 (FIG. 1) of Communication Device 200. Referring to the present drawing, Communication Device 200 sends a request for the communication device IDs, the communication device icon image data, and the user name data (S1), and Host H receives the request (S2). Host H then retrieves the communication device IDs, the communication device icon image data, and the user name data from Com. Device Icon Image Data Storage Area H50*b*1*a*6 (FIG. 1042) (S3), and sends these data to Communication Device 200 (S4). Upon receiving the communication device IDs, the communication device icon image data, and the user name data (S5), CPU 211 (FIG. 1) of Communication Device 200 stores these data in Com. Device Icon Image Data Storage Area 20650*b*1*a*6 (FIG. 1053) (S6). CPU 211 then retrieves the communication device IDs, the communication device icon image data, and the user name data from Com. Device Icon Image Data Storage Area 20650*b*1*a*6 (FIG. 1053) (S7), and displays on LCD 201 (FIG. 1) a list of the communication devices including these data (S8).

FIG. 1076 illustrates Com. Device Selecting Software 20650*c*13 stored in House Item Pin-pointing Software Storage Area 20650*c* (FIG. 1059) of Communication Device 200, which selects a communication device from the communication device list displayed on LCD 201 (FIG. 1) of Communication Device 200. Referring to the present drawing, a communication device which is to be located by implementing the present function is selected from the list displayed in S8 of FIG. 1075 by utilizing Input Device 210 (FIG. 1) or via voice recognition system (S1). CPU 211 (FIG. 1) then stores the selected communication device ID in Selected Com. Device ID Storage Area 20650*b*4 (FIG. 1051) (S2).

FIG. 1077 illustrates Selected Com. Device ID Sending/Receiving Software H50*c*14 stored in House Item Pin-pointing Software Storage Area H50*c* (FIG. 1048) of Host H (FIG. 429) and Selected Com. Device ID Sending/Receiving Software 20650*c*14 stored in House Item Pin-pointing Software Storage Area 20650*c* (FIG. 1059) of Communication Device 200, which respectively sends and receives the communication device ID selected by Com. Device Selecting Software 20650*c*13 described in FIG. 1076. Referring to the present drawing, CPU 211 (FIG. 1) of Communication Device 200 retrieves the selected communication device ID from Selected Com. Device ID Storage Area 20650*b*4 (FIG. 1051) (S1). CPU 211 sends the selected communication device ID (S2), which is received by Host H (S3). Host H then stores the selected communication device ID in Selected Com. Device ID Storage Area H50*b*4 (FIG. 1040) (S4).

FIG. 1078 illustrates Selected Com. Device Finding Software H50*c*15 stored in House Item Pin-pointing Software Storage Area H50*c* (FIG. 1048) of Host H (FIG. 429), which finds the communication device selected by Com. Device Selecting Software 20650*c*13 described in FIG. 1076. Referring to the present drawing, Host H receives the ID signals from all communication devices via relays described in FIGS. 1027 through 1030 (S1). Here, the ID signals are the signals emitted from the relays representing their identifications. Host H then detects the selected communication device (S2), and identifies the room ID of the room in which the selected communication device is located (S3).

FIG. 1079 illustrates Selected Com. Device Locating Software H50*c*16 stored in House Item Pin-pointing Software Storage Area H50*c* (FIG. 1048) of Host H (FIG. 429), which locates the communication device selected by Com. Device Selecting Software 20650*c*13 described in FIG. 1076. Referring to the present drawing, Host H retrieves the row GPS data 50RGD from the relays in the room identified in S3 of FIG. 1078 (S1). The row GPS data 50RGD is stored in Work Area H50*b*2 (FIG. 1040) (S2). Host H then calculates the row GPS data 50RGD in Work Area H50*b*2 (FIG. 1040) to produce the calculated GPS data (S3), which is stored in Work Area H50*b*2 (FIG. 1040) (S4). Here, the row GPS data 50RGD is a primitive data utilized to produce the calculated GPS data, and the calculated GPS data is the data representing the location in (x, y, z) format.

FIG. 1080 illustrates Calculated GPS Data Sending/Receiving Software H50*c*17 stored in House Item Pin-pointing Software Storage Area H50*c* (FIG. 1048) of Host H (FIG. 429) and Calculated GPS Data Sending/Receiving Software 20650*c*17 stored in House Item Pin-pointing Software Storage Area 20650*c* (FIG. 1059) of Communication Device 200, which respectively sends and receives the calculated GPS data produced by Selected Com. Device Locating Software H50*c*16 described in FIG. 1079. Referring to the present drawing, Host H retrieves the calculated GPS Data from Work Area H50*b*2 (FIG. 1040) (S1), and sends the data to Communication Device 200 (S2). CPU 211 (FIG. 1) of Communication Device 200 receives the calculated GPS Data from Host H (S3), and stores the data in Work Area 20650*b*2 (FIG. 1051) (S4).

FIG. 1081 illustrates Selected Com. Device Displaying Software 20650*c*18 stored in House Item Pin-pointing Software Storage Area 20650*c* (FIG. 1059) of Communication Device 200, which displays the location of the communication device selected by Com. Device Selecting Software 20650*c*13 described in FIG. 1076. Referring to the present drawing, CPU 211 (FIG. 1) of Communication Device 200 retrieves the calculated GPS Data from Work Area 20650*b*2 (FIG. 1051) (S1) and further retrieves the communication device icon image data from Com. Device Icon Image Data Storage Area 20650*b*1*a*6 (FIG. 1053) by referring to the selected communication device ID stored in Selected Com. Device ID Storage Area 20650*b*4 (FIG. 1051) (S2). CPU 211 then displays the communication device icon image data on LCD 201 (FIG. 1) at the location corresponding to the calculated GPS data stored in S4 of FIG. 1080 (S3).

<<House Item Pin-Pointing Function—Another Embodiment01>>

FIGS. 1082 through 1102 illustrate another embodiment to implement the present function.

FIG. 1082 illustrates the software programs stored in House Item Pin-pointing Software Storage Area H50*c* (FIG. 1039) of Host H (FIG. 429). As described in the present drawing, House Item Pin-pointing Software Storage Area H50*c* stores House Data Requesting Software H50*c*19, House Data Sending/Receiving Software H50*c*20, Selected House Item ID Sending/Receiving Software H50*c*8, Selected House Item Finding Software H50*c*9, Selected House Item Locating Software H50*c*10, Calculated GPS Data Sending/Receiving Software H50*c*11, Selected Com. Device ID Sending/Receiving Software H50*c*14, Selected Com. Device Finding Software H50*c*15, Selected Com. Device Locating Software H50*c*16, and Calculated GPS Data Sending/Receiving Software H50*c*17. The sequence of each software program is described hereinafter.

FIG. 1083 illustrates the software programs stored in House Item Pin-pointing Software Storage Area 20650*c* (FIG. 1050). As described in the present drawing, House Item Pin-pointing Software Storage Area 20650*c* stores House Data Requesting Software 20650*c*19, House Data Sending/Receiving Software 20650*c*20, House Layout Data Displaying Software 20650*c*3, Room Layout Data Displaying Software 20650*c*6, House Item List Displaying Software 20650*c*6*a*, House Item Selecting Software 20650*c*7, Selected House Item ID Sending/Receiving Software 20650*c*8, Calculated GPS Data Sending/Receiving Software 20650*c*11, Selected House Item Displaying Software 20650*c*12, Com. Device List Displaying Software 20650*c*12*a*, Com. Device Selecting Software **20650*c*13, Selected Com. Device ID Sending/Receiving Software 20650*c*14, Calculated GPS Data Sending/Receiving Software 20650*c*17, and Selected Com. Device Displaying Software 20650*c*18**. The sequence of each software program is described hereinafter.

FIG. 1084 illustrates House Data Requesting Software H**50*c*19 stored in House Item Pin-pointing Software Storage Area H50*c* (FIG. 1082) of Host H (FIG. 429) and House Data Requesting Software 20650*c*19 stored in House Item Pin-pointing Software Storage Area 20650*c* (FIG. 1083) of Communication Device 200, which respectively sends and receives a house layout data request. Referring to the present drawing, CPU 211 (FIG. 1) of Communication Device 200 sends a house data request 50HDR (S1), which is received by Host H (S2). Here, the house data request 50HDR is a request signal described in FIG. 1085**.

FIG. 1085 illustrates the data included in House Data Request 50HDR described in FIG. 1084. As described in the present drawing, House Data Request 50HDR includes Request Signal 50HDRa and House ID 50HDRb. Request Signal 50HDRa is a signal requesting to send to Communication Device 200 one of the house data stored in House Data Storage Area H**50*b*1 (FIG. 1040) (the house#1 data in the present example). House ID 50HDRb is the house ID representing the identification of a house (house #1** in the present example).

FIG. 1086 illustrates House Data Sending/Receiving Software H**50*c*20 stored in House Item Pin-pointing Software Storage Area H50*c* (FIG. 1082) of Host H (FIG. 429) and House Data Sending/Receiving Software 20650*c*20 stored in House Item Pin-pointing Software Storage Area 20650*c* (FIG. 1083) of Communication Device 200, which respectively sends and receives a house layout data. Referring to the present drawing, Host H retrieves the house ID from House Layout Data Request 50HDR (FIG. 1085) (S1) and identifies the house data stored in House Data Storage Area H50*b*1 (FIG. 1040) (in the present example, House#1 Data Storage Area H50*b*1*a* is selected) (S2). Host H then retrieves the house data from House#1 Data Storage Area H50*b*1*a* (FIG. 1041) (S3), and sends the data to Communication Device 200 (S4). CPU 211 (FIG. 1) of Communication Device 200 receives the house data (S5), and stores the data in House#1 Data Storage Area 20650*b*1*a* (FIG. 1052) (S6**).

FIG. 1087 illustrates House Layout Data Displaying Software **20650*c*3 stored in House Item Pin-pointing Software Storage Area 20650*c* (FIG. 1083) of Communication Device 200, which displays house layout data on LCD 201 (FIG. 1) of Communication Device 200. Referring to the present drawing, CPU 211 (FIG. 1) of Communication Device 200 retrieves the house layout data from House Layout Data Storage Area 20650*b*1*a*3 (FIG. 1053) (S1), and displays the data on LCD 201 (FIG. 1) (S2**).

FIG. 1088 illustrates Room Layout Data Displaying Software **20650*c*6 stored in House Item Pin-pointing Software Storage Area 20650*c* (FIG. 1083) of Communication Device 200, which displays the room layout data on LCD 201 (FIG. 1) of Communication Device 200. Referring to the present drawing, CPU 211 (FIG. 1) of Communication Device 200 retrieves the room layout data from Room Layout Data Storage Area 20650*b*1*a*4 (FIG. 1053) (S1) and displays the data on LCD 201 (FIG. 1) (S2**).

FIGS. 1089 through 1095 illustrate the method to display the house item icons on LCD 201 (FIG. 1) of Communication Device 200.

FIG. 1089 illustrates House Item List Displaying Software **20650*c*6*a* stored in House Item Pin-pointing Software Storage Area 20650*c* (FIG. 1083) of Communication Device 200. Referring to the present drawing, CPU 211 (FIG. 1) of Communication Device 200 retrieves the house item IDs, the house item icon image data, and the house item name data from House Item Icon Image Data Storage Area 20650*b*1*a*5 (FIG. 1053) (S1). CPU 211 then displays on LCD 201 (FIG. 1) a list of the house items including these data (S2**).

FIG. 1090 illustrates House Item Selecting Software **20650*c*7 stored in House Item Pin-pointing Software Storage Area 20650*c* (FIG. 1083) of Communication Device 200, which selects a house item from the house item list displayed on LCD 201 (FIG. 1) of Communication Device 200. Referring to the present drawing, the house item which is to be located by implementing the present function is selected from the list displayed in S2 of FIG. 1089 by utilizing Input Device 210 (FIG. 1) or via voice recognition system (S1). CPU 211 (FIG. 1) then stores the selected house item ID in Selected House Item ID Storage Area 20650*b*3 (FIG. 1051) (S2**).

FIG. 1091 illustrates Selected House Item ID Sending/Receiving Software H**50*c*8 stored in House Item Pin-pointing Software Storage Area H50*c* (FIG. 1082) of Host H (FIG. 429) and Selected House Item ID Sending/Receiving Software 20650*c*8 stored in House Item Pin-pointing Software Storage Area 20650*c* (FIG. 1083) of Communication Device 200, which respectively sends and receives house item ID selected by House Item Selecting Software 20650*c*7 described in FIG. 1090. Referring to the present drawing, CPU 211 (FIG. 1) of Communication Device 200 retrieves the selected house item ID from Selected House Item ID Storage Area 20650*b*3 (FIG. 1051) (S1). CPU 211 sends the selected house item ID (S2), which is received by Host H (S3). Host H then stores the selected house item ID in Selected House Item ID Storage Area H50*b*3 (FIG. 1040) (S4**).

FIG. 1092 illustrates Selected House Item Finding Software H**50*c*9 stored in House Item Pin-pointing Software Storage Area H50*c* (FIG. 1082) of Host H (FIG. 429), which finds the house item selected by House Item Selecting Software 20650*c*7 described in FIG. 1090. Referring to the present drawing, Host H receives the ID signals from all house items via relays described in FIGS. 1027 through 1030 (S1). Here, the ID signals are the signals emitted from the relays representing their identifications. Host H then detects the selected house item (S2), and identifies the room ID of the room in which the selected house item is located (S3**).

FIG. 1093 illustrates Selected House Item Locating Software H**50*c*10 stored in House Item Pin-pointing Software Storage Area H50*c* (FIG. 1082) of Host H (FIG. 429), which locates the house item selected by House Item Selecting Software 20650*c*7 described in FIG. 1090. Referring to the present drawing, Host H retrieves the row GPS data 50RGD from the relays in the room identified in S3 of FIG. 1092 (S1). The row GPS data 50RGD is stored in Work Area H50*b*2 (FIG. 1040) (S2). Host H then calculates the row GPS data 50RGD in Work Area H50*b*2 (FIG. 1040) to produce the calculated GPS data (S3), which is stored in Work Area H50*b*2 (FIG. 1040) (S4). Here, the row GPS data 50**RGD is a primitive data utilized to produce the calculated GPS data, and the calculated GPS data is the data representing the location in (x, y, z) format.

FIG. 1094 illustrates Calculated GPS Data Sending/Receiving Software H**50*c*11 stored in House Item Pin-pointing Software Storage Area H50*c* (FIG. 1082) of Host H (FIG. 429) and Calculated GPS Data Sending/Receiving Software 20650*c*11 stored in House Item Pin-pointing Software Storage Area 20650*c* (FIG. 1083) of Communication Device 200, which respectively sends and receives the calculated GPS data produced by Selected House Item Locating Software H50*c*10 described in FIG. 1093. Referring to the present drawing, Host H retrieves the calculated GPS Data from Work Area H50*b*2 (FIG. 1040) (S1), and sends the data to Communication Device 200 (S2). CPU 211 (FIG. 1) of Communication Device 200 receives the calculated GPS Data from Host H (S3), and stores the data in Work Area 20650*b*2 (FIG. 1051) (S4**).

FIG. 1095 illustrates Selected House Item Displaying Software 20650*c*12 stored in House Item Pin-pointing Software Storage Area 20650*c* (FIG. 1083) of Communication Device 200, which displays the location of the house item selected by House Item Selecting Software 20650*c*7 described in FIG. 1090. Referring to the present drawing, CPU 211 (FIG. 1) of Communication Device 200 retrieves the calculated GPS Data from Work Area 20650*b*2 (FIG. 1051) (S1) and further retrieves the house item icon image data from House Item Icon Image Data Storage Area 20650*b*1*a*5 (FIG. 1053) by referring to the selected house item ID stored in Selected House Item ID Storage Area 20650*b*3 (FIG. 1051) (S2). CPU 211 then displays the house item icon image data on LCD 201 (FIG. 1) at the location corresponding to the calculated GPS data stored in S4 of FIG. 1094 (S3).

FIGS. 1096 through 1102 illustrate the method to display the communication device icons on LCD 201 (FIG. 1) of Communication Device 200.

FIG. 1096 illustrates Com. Device List Displaying Software 20650*c*12*a* stored in House Item Pin-pointing Software Storage Area 20650*c* (FIG. 1083) of Communication Device 200. Referring to the present drawing, CPU 211 (FIG. 1) of Communication Device 200 retrieves the communication device IDs, the communication device icon image data, and the user name data from Com. Device Icon Image Data Storage Area 20650*b*1*a*6 (FIG. 1083) (S1). CPU 211 then displays on LCD 201 (FIG. 1) a list of the communication devices including these data (S2).

FIG. 1097 illustrates Com. Device Selecting Software 20650*c*13 stored in House Item Pin-pointing Software Storage Area 20650*c* (FIG. 1083) of Communication Device 200, which selects a communication device from the communication device list displayed on LCD 201 (FIG. 1) of Communication Device 200. Referring to the present drawing, a communication device which is to be located by implementing the present function is selected from the list displayed in S2 of FIG. 1096 by utilizing Input Device 210 (FIG. 1) or via voice recognition system (S1). CPU 211 (FIG. 1) then stores the selected communication device ID in Selected Com. Device ID Storage Area 20650*b*4 (FIG. 1051) (S2).

FIG. 1098 illustrates Selected Com. Device ID Sending/Receiving Software H50*c*14 stored in House Item Pin-pointing Software Storage Area H50*c* (FIG. 1082) of Host H (FIG. 429) and Selected Com. Device ID Sending/Receiving Software 20650*c*14 stored in House Item Pin-pointing Software Storage Area 20650*c* (FIG. 1083) of Communication Device 200, which respectively sends and receives the communication device ID selected by Com. Device Selecting Software 20650*c*13 described in FIG. 1076. Referring to the present drawing, CPU 211 (FIG. 1) of Communication Device 200 retrieves the selected communication device ID from Selected Com. Device ID Storage Area 20650*b*4 (FIG. 1051) (S1). CPU 211 sends the selected communication device ID (S2), which is received by Host H (S3). Host H then stores the selected communication device ID in Selected Com. Device ID Storage Area H50*b*4 (FIG. 1040) (S4).

FIG. 1099 illustrates Selected Com. Device Finding Software H50*c*15 stored in House Item Pin-pointing Software Storage Area H50*c* (FIG. 1082) of Host H (FIG. 429), which finds the communication device selected by Com. Device Selecting Software 20650*c*13 described in FIG. 1097. Referring to the present drawing, Host H receives the ID signals from all communication devices via relays described in FIGS. 1027 through 1030 (S1). Here, the ID signals are the signals emitted from the relays representing their identifications. Host H then detects the selected communication device (S2), and identifies the room ID of the room in which the selected communication device is located (S3).

FIG. 1100 illustrates Selected Com. Device Locating Software H50*c*16 stored in House Item Pin-pointing Software Storage Area H50*c* (FIG. 1082) of Host H (FIG. 429), which locates the communication device selected by Com. Device Selecting Software 20650*c*13 described in FIG. 1097. Referring to the present drawing, Host H retrieves the row GPS data 50RGD from the relays in the room identified in S3 of FIG. 1099 (S1). The row GPS data 50RGD is stored in Work Area H50*b*2 (FIG. 1040) (S2). Host H then calculates the row GPS data 50RGD in Work Area H50*b*2 (FIG. 1040) to produce the calculated GPS data (S3), which is stored in Work Area H50*b*2 (FIG. 1040) (S4). Here, the row GPS data 50RGD is a primitive data utilized to produce the calculated GPS data, and the calculated GPS data is the data representing the location in (x, y, z) format.

FIG. 1101 illustrates Calculated GPS Data Sending/Receiving Software H50*c*17 stored in House Item Pin-pointing Software Storage Area H50*c* (FIG. 1082) of Host H (FIG. 429) and Calculated GPS Data Sending/Receiving Software 20650*c*17 stored in House Item Pin-pointing Software Storage Area 20650*c* (FIG. 1083) of Communication Device 200, which respectively sends and receives the calculated GPS data produced by Selected Com. Device Locating Software H50*c*16 described in FIG. 1100. Referring to the present drawing, Host H retrieves the calculated GPS Data from Work Area H50*b*2 (FIG. 1040) (S1), and sends the data to Communication Device 200 (S2). CPU 211 (FIG. 1) of Communication Device 200 receives the calculated GPS Data from Host H (S3), and stores the data in Work Area 20650*b*2 (FIG. 1051) (S4).

FIG. 1102 illustrates Selected Com. Device Displaying Software 20650*c*18 stored in House Item Pin-pointing Software Storage Area 20650*c* (FIG. 1083) of Communication Device 200, which displays the location of the communication device selected by Com. Device Selecting Software 20650*c*13 described in FIG. 1097. Referring to the present drawing, CPU 211 (FIG. 1) of Communication Device 200 retrieves the calculated GPS Data from Work Area 20650*b*2 (FIG. 1051) (S1) and further retrieves the communication device icon image data from Com. Device Icon Image Data Storage Area 20650*b*1*a*6 (FIG. 1053) by referring to the selected communication device ID stored in Selected Com. Device ID Storage Area 20650*b*4 (FIG. 1051) (S2). CPU 211 then displays the communication device icon image data on LCD 201 (FIG. 1) at the location corresponding to the calculated GPS data stored in S4 of FIG. 1101 (S3).

<<House Item Pin-Pointing Function—Another Embodiment02>>

FIGS. 1103 through 1128 illustrate another embodiment to implement the present function.

FIG. 1103 illustrates the software programs stored in House Item Pin-pointing Software Storage Area H50*c* (FIG. 1039). As described in the present drawing, House Item Pin-pointing Software Storage Area H50*c* stores House Data Requesting Software H50*c*19, House Data Sending/Receiving Software H50*c*20, Selected House Item ID Sending/Receiving Software H50*c*8, Selected House Item Finding Software H50*c*9, Row GPS Data Sending/Receiving Software H50*c*19, GPS Data Calculating Software H50*c*20*a*, Calculated GPS Data Sending/Receiving Software H50*c*21, Selected Com. Device ID Sending/Receiving Software H50*c*14, and Selected Com. Device Finding Software H50*c*15. The sequence of each software program is described hereinafter.

FIG. 1104 illustrates the software programs stored in House Item Pin-pointing Software Storage Area 20650*c* (FIG. 1050). As described in the present drawing, House Item Pin-pointing Software Storage Area 20650*c* stores House Data Requesting Software 20650*c*19, House Data Sending/Receiving Software 20650*c*20, House Layout Data Displaying Software 20650*c*3, Room Layout Data Displaying Software 20650*c*6, House Item List Displaying Software 20650*c*6*a*, House Item Selecting Software 20650*c*7, Selected House Item ID Sending/Receiving Software 20650*c*8, Calculated GPS Data Sending/Receiving Software 20650*c*21, Selected House Item Displaying Software 20650*c*12, Com. Device List Displaying Software 20650*c*12*a*, Com. Device Selecting Software 20650*c*13, Selected Com. Device ID Sending/Receiving Software 20650*c*14, Row GPS Data Sending/Receiving Software 20650*c*19, and Selected Com. Device Displaying Software 20650*c*18. The sequence of each software program is described hereinafter.

FIG. 1105 illustrates the software program stored in House Item Pin-pointing Software Storage Area HI50*c* described in FIG. 1154 hereinafter. As described in the present drawing, House Item Pin-pointing Software Storage Area HI50*c* stores Row GPS Data Sending/Receiving Software HI50*c*19 of which the sequence is described hereinafter.

FIGS. 1106 through 1108 illustrate the method to download the house data to Communication Device 200.

FIG. 1106 illustrates House Data Requesting Software H50*c*19 stored in House Item Pin-pointing Software Storage Area H50*c* (FIG. 1103) of Host H (FIG. 429) and House Data Requesting Software 20650*c*19 stored in House Item Pin-pointing Software Storage Area 20650*c* (FIG. 1104) of Communication Device 200, which respectively sends and receives a house layout data request. Referring to the present drawing, CPU 211 (FIG. 1) of Communication Device 200 sends a house data request 50HDR (S1), which is received by Host H (S2). Here, the house data request 50HDR is a request signal described in FIG. 1107.

FIG. 1107 illustrates the data included in House Data Request 50HDR described in FIG. 1106. As described in the present drawing, House Data Request 50HDR includes Request Signal 50HDRa and House ID 50HDRb. Request Signal 50HDRa is a signal requesting to send to Communication Device 200 one of the house data stored in House Data Storage Area H50*b*1 (FIG. 1040) (the house#1 data in the present example). House ID 50HDRb is the house ID representing the identification of a house (house #1 in the present example).

FIG. 1108 illustrates House Data Sending/Receiving Software H50*c*20 stored in House Item Pin-pointing Software Storage Area H50*c* (FIG. 1103) of Host H (FIG. 429) and House Data Sending/Receiving Software 20650*c*20 stored in House Item Pin-pointing Software Storage Area 20650*c* (FIG. 1104) of Communication Device 200, which respectively sends and receives a house layout data. Referring to the present drawing, Host H retrieves the house ID from House Layout Data Request 50HDR (FIG. 1107) (S1) and identifies the house data stored in House Data Storage Area H50*b*1 (FIG. 1040) (in the present example, House#1 Data Storage Area H50*b*1*a* is selected) (S2). Host H then retrieves the house data from House#1 Data Storage Area H50*b*1*a* (FIG. 1041) (S3), and sends the data to Communication Device 200 (S4). CPU 211 (FIG. 1) of Communication Device 200 receives the house data (S5), and stores the data in House#1 Data Storage Area 20650*b*1*a* (FIG. 1052) (S6).

FIG. 1109 illustrates House Layout Data Displaying Software 20650*c*3 stored in House Item Pin-pointing Software Storage Area 20650*c* (FIG. 1104) of Communication Device 200, which displays house layout data on LCD 201 (FIG. 1) of Communication Device 200. Referring to the present drawing, CPU 211 (FIG. 1) of Communication Device 200 retrieves the house layout data from House Layout Data Storage Area 20650*b*1*a*3 (FIG. 1053) (S1), and displays the data on LCD 201 (FIG. 1) (S2).

FIG. 1110 illustrates Room Layout Data Displaying Software 20650*c*6 stored in House Item Pin-pointing Software Storage Area 20650*c* (FIG. 1104) of Communication Device 200, which displays room layout data on LCD 201 (FIG. 1) of Communication Device 200. Referring to the present drawing, CPU 211 (FIG. 1) of Communication Device 200 retrieves the room layout data from Room Layout Data Storage Area 20650*b*1*a*4 (FIG. 1053) (S1) and displays the data on LCD 201 (FIG. 1) (S2).

FIGS. 1111 through 1119 illustrate the method to display the house item icons on LCD 201 (FIG. 1) of Communication Device 200.

FIG. 1111 illustrates House Item List Displaying Software 20650*c*6*a* stored in House Item Pin-pointing Software Storage Area 20650*c* (FIG. 1104) of Communication Device 200. Referring to the present drawing, CPU 211 (FIG. 1) of Communication Device 200 retrieves the house item IDs, the house item icon image data, and the house item name data from House Item Icon Image Data Storage Area 20650*b*1*a*5 (FIG. 1053) (S1). CPU 211 then displays on LCD 201 (FIG. 1) a list of the house items including these data (S2).

FIG. 1112 illustrates House Item Selecting Software 20650*c*7 stored in House Item Pin-pointing Software Storage Area 20650*c* (FIG. 1104) of Communication Device 200, which selects a house item from the house item list displayed on LCD 201 (FIG. 1) of Communication Device 200. Referring to the present drawing, a house item which is to be located by implementing the present function is selected from the list displayed in S2 of FIG. 1111 by utilizing Input Device 210 (FIG. 1) or via voice recognition system (S1). CPU 211 (FIG. 1) then stores the selected house item ID in Selected House Item ID Storage Area 20650*b*3 (FIG. 1051) (S2).

FIG. 1113 illustrates Selected House Item ID Sending/Receiving Software H50*c*8 stored in House Item Pin-pointing Software Storage Area H50*c* (FIG. 1103) of Host H (FIG. 429) and Selected House Item ID Sending/Receiving Software 20650*c*8 stored in House Item Pin-pointing Software Storage Area 20650*c* (FIG. 1104) of Communication Device 200, which respectively sends and receives house item ID selected by House Item Selecting Software 20650*c*7 described in FIG. 1112. Referring to the present drawing, CPU 211 (FIG. 1) of Communication Device 200 retrieves the selected house item ID from Selected House Item ID Storage Area 20650*b*3 (FIG. 1051) (S1). CPU 211 sends the selected house item ID (S2), which is received by Host H (S3). Host H then stores the selected house item ID in Selected House Item ID Storage Area H50*b*3 (FIG. 1040) (S4).

FIG. 1114 illustrates Selected House Item Finding Software H50*c*9 stored in House Item Pin-pointing Software Storage Area H50*c* (FIG. 1103) of Host H (FIG. 429), which finds the house item selected by House Item Selecting Software 20650*c*7 described in FIG. 1112. Referring to the present drawing, Host H receives the ID signals from all house items via relays described in FIGS. 1027 through 1030 (S1). Here, the ID signals are the signals emitted from the relays representing their identifications. Host H then detects the selected house item (S2).

FIG. 1115 illustrates Row GPS Data Sending/Receiving Software H50*c*19 stored in House Item Pin-pointing Software Storage Area H50*c* (FIG. 1103) of Host H (FIG. 429) and Row GPS Data Sending/Receiving Software HI50*c*19 stored in House Item Pin-pointing Software Storage Area HI50*c* (FIG. 1105) of House Item HI (FIG. 1151), which respectively sends and receives Row GPS Data 50RGD. Referring to the present drawing, House Item HI retrieves Row GPS Data 50RGD from the relays described in FIGS. 1027 through 1030 (S1), and sends Row GPS Data 50RGD to Host H (S2). Host H then receives Row GPS Data 50RGD (S3), and stores the data in Work Area H50*b*2 (FIG. 1040) (S4).

FIG. 1116 illustrates the data included in Row GPS Data 50RGD described in FIG. 1115. Referring to the present drawing, Row GPS Data 50RGD comprises a relay ID and a row GPS data. Here, the relay ID is the identification of the relay and the row GPS data is a primitive data utilized to produce a calculated GPS data. Assuming that House Item HI, Glasses 50GL (FIG. 1022) for example, is placed in Room A. As described in FIG. 1027, four relays, i.e., R50A1, R50A2, R50A3, and R50A4 are installed in Room A. House Item HI (Glasses 50GL) receives four Row GPS Data 50RGD, each of which from R50A1, R50A2, R50A3, and R50A4, respectively, namely, the first Row GPS Data 50RGD of which the relay ID is R50A1 and of which the row GPS data is the one received from relay R50A1; the second Row GPS Data 50RGD of which the relay ID is R50A2 and of which the row GPS data is the one received from relay R50A2; the third Row GPS Data 50RGD of which the relay ID is R50A3 and of which the row GPS data is the one received from relay R50A3; and the fourth Row GPS Data 50RGD of which the relay ID is R50A4 and of which the row GPS data is the one received from relay R50A4.

FIG. 1117 illustrates GPS Data Calculating Software H50*c*20*a* stored in House Item Pin-pointing Software Storage Area H50*c* (FIG. 1103) of Host H (FIG. 429), which produces a calculated GPS data. Referring to the present drawing, Host H produces the calculated GPS data by utilizing a plurality of Row GPS Data 50RGD stored in Work Area H50*b*2 (FIG. 1040) (S1), and stores the calculated GPS data in Work Area H50*b*2 (S2). Here, the calculated GPS data is the data representing the location of House Item HI, Glasses 50GL (FIG. 1022) for example, in (x, y, z) format.

FIG. 1118 illustrates Calculated GPS Data Sending/Receiving Software H50*c*21 stored in House Item Pin-pointing Software Storage Area H50*c* (FIG. 1103) of Host H (FIG. 429) and Calculated GPS Data Sending/Receiving Software 20650*c*21 stored in House Item Pin-pointing Software Storage Area 20650*c* (FIG. 1104) of Communication Device 200, which respectively sends and receives the calculated GPS data. Referring to the present drawing, Host H sends the calculated GPS data to Communication Device 200 (S1). CPU 211 (FIG. 1) of Communication Device 200 receives the calculated GPS Data from Host H (S2), and stores the data in Work Area 20650*b*2 (FIG. 1051) (S3).

FIG. 1119 illustrates Selected House Item Displaying Software 20650*c*12 stored in House Item Pin-pointing Software Storage Area 20650*c* (FIG. 1104) of Communication Device 200, which displays the location of the house item selected by House Item Selecting Software 20650*c*7 described in FIG. 1112. Referring to the present drawing, CPU 211 (FIG. 1) of Communication Device 200 retrieves the calculated GPS Data from Work Area 20650*b*2 (FIG. 1051) (S1) and further retrieves the house item icon image data from House Item Icon Image Data Storage Area 20650*b*1*a*5 (FIG. 1053) by referring to the selected house item ID stored in Selected House Item ID Storage Area 20650*b*3 (FIG. 1051) (S2). CPU 211 then displays the house item icon image data on LCD 201 (FIG. 1) at the location corresponding to the calculated GPS data stored in S3 of FIG. 1118 (S3).

FIGS. 1120 through 1128 illustrate the method to display the communication device icons on LCD 201 (FIG. 1) of Communication Device 200.

FIG. 1120 illustrates Com. Device List Displaying Software 20650*c*12*a* stored in House Item Pin-pointing Software Storage Area 20650*c* (FIG. 1104) of Communication Device 200. Referring to the present drawing, CPU 211 (FIG. 1) of Communication Device 200 retrieves the communication device IDs, the communication device icon image data, and the user name data from Com. Device Icon Image Data Storage Area 20650*b*1*a*6 (FIG. 1083) (S1). CPU 211 then displays on LCD 201 (FIG. 1) a list of the communication devices including these data (S2).

FIG. 1121 illustrates Com. Device Selecting Software 20650*c*13 stored in House Item Pin-pointing Software Storage Area 20650*c* (FIG. 1104) of Communication Device 200, which selects a communication device from the communication device list displayed on LCD 201 (FIG. 1) of Communication Device 200. Referring to the present drawing, a communication device which is to be located by implementing the present function is selected from the list displayed in S2 of FIG. 1120 by utilizing Input Device 210 (FIG. 1) or via voice recognition system (S1). CPU 211 (FIG. 1) then stores the selected communication device ID in Selected Com. Device ID Storage Area 20650*b*4 (FIG. 1051) (S2).

FIG. 1122 illustrates Selected Com. Device ID Sending/Receiving Software H50*c*14 stored in House Item Pin-pointing Software Storage Area H50*c* (FIG. 1103) of Host H (FIG. 429) and Selected Com. Device ID Sending/Receiving Software 20650*c*14 stored in House Item Pin-pointing Software Storage Area 20650*c* (FIG. 1104) of Communication Device 200, which respectively sends and receives the communication device ID selected by Com. Device Selecting Software 20650*c*13 described in FIG. 1121. Referring to the present drawing, CPU 211 (FIG. 1) of Communication Device 200 retrieves the selected communication device ID from Selected Com. Device ID Storage Area 20650*b*4 (FIG. 1051) (S1). CPU 211 sends the selected communication device ID (S2), which is received by Host H (S3). Host H then stores the selected communication device ID in Selected Com. Device ID Storage Area H50*b*4 (FIG. 1040) (S4).

FIG. 1123 illustrates Selected Com. Device Finding Software H50*c*15 stored in House Item Pin-pointing Software Storage Area H50*c* (FIG. 1103) of Host H (FIG. 429), which finds the communication device selected by Com. Device Selecting Software 20650*c*13 described in FIG. 1121. Referring to the present drawing, Host H receives the ID signals from all communication devices via relays described in FIGS. 1027 through 1030 (S1). Here, the ID signals are the signals emitted from the relays representing their identifications. Host H then detects the selected communication device therefrom (S2).

FIG. 1124 illustrates Row GPS Data Sending/Receiving Software H50*c*19 stored in House Item Pin-pointing Software Storage Area H50*c* (FIG. 1103) of Host H (FIG. 429) and Row GPS Data Sending/Receiving Software 20650*c*19 stored in House Item Pin-pointing Software Storage Area HI50*c* (FIG. 1104) of Communication Device 200, which respectively sends and receives Row GPS Data 50RGD.

Referring to the present drawing, Communication Device 200 retrieves Row GPS Data 50RGD from the relays described in FIGS. 1027 through 1030 (S1), and sends Row GPS Data 50RGD to Host H (S2). Host H then receives Row GPS Data 50RGD (S3), and stores the data in Work Area H50*b*2 (FIG. 1040) (S4).

FIG. 1125 illustrates the data included in Row GPS Data 50RGD described in FIG. 1124. Referring to the present drawing, Row GPS Data 50RGD comprises a relay ID and a row GPS data. Here, the relay ID is the identification of the relay and the row GPS data is a primitive data utilized to produce a calculated GPS data. Assuming that Communication Device 200 is placed in Room A. As described in FIG. 1027, four relays, i.e., R50A1, R50A2, R50A3, and R50A4 are installed in Room A. Communication Device 200 receives four Row GPS Data 50RGD, each of which from R50A1, R50A2, R50A3, and R50A4, respectively, namely, the first Row GPS Data 50RGD of which the relay ID is R50A1 and of which the row GPS data is the one received from relay R50A1; the second Row GPS Data 50RGD of which the relay ID is R50A2 and of which the row GPS data is the one received from relay R50A2; the third Row GPS Data 50RGD of which the relay ID is R50A3 and of which the row GPS data is the one received from relay R50A3; and the fourth Row GPS Data 50RGD of which the relay ID is R50A4 and of which the row GPS data is the one received from relay R50A4.

FIG. 1126 illustrates GPS Data Calculating Software H50*c*20*a* stored in House Item Pin-pointing Software Storage Area H50*c* (FIG. 1103) of Host H (FIG. 429), which produces a calculated GPS data. Referring to the present drawing, Host H produces the calculated GPS data by utilizing a plurality of Row GPS Data 50RGD stored in Work Area H50*b*2 (FIG. 1040) (S1), and stores the calculated GPS data in Work Area H50*b*2 (S2). Here, the calculated GPS data is the data representing the location of Communication Device 200 in (x, y, z) format.

FIG. 1127 illustrates Calculated GPS Data Sending/Receiving Software H50*c*21 stored in House Item Pin-pointing Software Storage Area H50*c* (FIG. 1103) of Host H (FIG. 429) and Calculated GPS Data Sending/Receiving Software 20650*c*21 stored in House Item Pin-pointing Software Storage Area 20650*c* (FIG. 1104) of Communication Device 200, which respectively sends and receives the calculated GPS data. Referring to the present drawing, Host H sends the calculated GPS data to Communication Device 200 (S1). CPU 211 (FIG. 1) of Communication Device 200 receives the calculated GPS Data from Host H (S2), and stores the data in Work Area 20650*b*2 (FIG. 1051) (S3).

FIG. 1128 illustrates Selected Com. Device Displaying Software 20650*c*18 stored in House Item Pin-pointing Software Storage Area 20650*c* (FIG. 1059) of Communication Device 200, which displays the location of the communication device selected by Com. Device Selecting Software 20650*c*13 described in FIG. 1121. Referring to the present drawing, CPU 211 (FIG. 1) of Communication Device 200 retrieves the calculated GPS Data from Work Area 20650*b*2 (FIG. 1051) (S1) and further retrieves the communication device icon image data from Com. Device Icon Image Data Storage Area 20650*b*1*a*6 (FIG. 1053) by referring to the selected communication device ID stored in Selected Com. Device ID Storage Area 20650*b*4 (FIG. 1051) (S2). CPU 211 then displays the communication device icon image data on LCD 201 (FIG. 1) at the location corresponding to the calculated GPS data stored in S3 of FIG. 1127 (S3).

<<House Item Pin-Pointing Function—Another Embodiment03>>

FIGS. 1129 through 1150 illustrate another embodiment to implement the present function. Two Communication Devices 200, Device A and Device B, are utilized in this embodiment.

FIG. 1129 illustrates the software programs stored in House Item Pin-pointing Software Storage Area H50*c* (FIG. 1039). As described in the present drawing, House Item Pin-pointing Software Storage Area H50*c* stores House Data Requesting Software H50*c*19 and House Data Sending/Receiving Software H50*c*20. The sequence of each software program is described hereinafter.

FIG. 1130 illustrates the software programs stored in House Item Pin-pointing Software Storage Area 20650*c* (FIG. 1050) of Device A. As described in the present drawing, House Item Pin-pointing Software Storage Area 20650*c* stores House Data Requesting Software 20650*c*19, House Data Sending/Receiving Software 20650*c*20, House Layout Data Displaying Software 20650*c*3, Room Layout Data Displaying Software 20650*c*6, House Item List Displaying Software 20650*c*6*a*, House Item Selecting Software 20650*c*7, Selected House Item Finding Software 20650*c*21, Row GPS Data Sending/Receiving Software 20650*c*19, GPS Data Calculating Software 20650*c*20, Selected House Item Displaying Software 20650*c*12, Com. Device List Displaying Software 20650*c*12*a*, Com. Device Selecting Software 20650*c*13, Selected Com. Device Finding Software H50*c*15, and Selected Com. Device Displaying Software 20650*c*18. The sequence of each software program is described hereinafter.

FIG. 1131 illustrates the software programs stored in House Item Pin-pointing Software Storage Area 20650*c* (FIG. 1050) of Device B. As described in the present drawing, House Item Pin-pointing Software Storage Area 20650*c* stores Row GPS Data Sending/Receiving Software 20650*c*19 of which the sequence is described hereinafter.

FIG. 1131*a* illustrates the software program stored in House Item Pin-pointing Software Storage Area HI50*c* described in FIG. 1154 hereinafter. As described in the present drawing, House Item Pin-pointing Software Storage Area HI50*c* stores Row GPS Data Sending/Receiving Software HI50*c*19 of which the sequence is described hereinafter.

FIGS. 1132 through 1134 illustrate the method to download the house data to Communication Device 200.

FIG. 1132 illustrates House Data Requesting Software H50*c*19 stored in House Item Pin-pointing Software Storage Area H50*c* (FIG. 1129) of Host H (FIG. 429) and House Data Requesting Software 20650*c*19 stored in House Item Pin-pointing Software Storage Area 20650*c* (FIG. 1130) of Device A, which respectively sends and receives a house layout data request. Referring to the present drawing, CPU 211 (FIG. 1) of Device A sends a house data request 50HDR (S1), which is received by Host H (S2). Here, the house data request 50HDR is a request signal described in FIG. 1133.

FIG. 1133 illustrates the data included in House Data Request 50HDR described in FIG. 1132. As described in the present drawing, House Data Request 50HDR includes Request Signal 50HDRa and House ID 50HDRb. Request Signal 50HDRa is a signal requesting to send to Device A one of the house data stored in House Data Storage Area H50*b*1 (FIG. 1040) (the house#1 data in the present example). House ID 50HDRb is the house ID representing the identification of a house (house #1 in the present example).

FIG. 1134 illustrates House Data Sending/Receiving Software H50*c*20 stored in House Item Pin-pointing Software Storage Area H50*c* (FIG. 1129) of Host H (FIG. 429) and House Data Sending/Receiving Software 20650*c*20 stored in House Item Pin-pointing Software Storage Area 20650*c* (FIG. 1130) of Device A, which respectively sends and receives a house layout data. Referring to the present drawing, Host H retrieves the house ID from House Layout Data Request 50HDR (FIG. 1133) (S1) and identifies the house data stored in House Data Storage Area H50*b*1 (FIG. 1040) (in the present example, House#1 Data Storage Area H50*b*1*a* is selected) (S2). Host H then retrieves the house data from House#1 Data Storage Area H50*b*1*a* (FIG. 1041) (S3), and sends the data to Device A (S4). CPU 211 (FIG. 1) of Device A receives the house data (S5), and stores the data in House#1 Data Storage Area 20650*b*1*a* (FIG. 1052) (S6).

FIG. 1135 illustrates House Layout Data Displaying Software 20650*c*3 stored in House Item Pin-pointing Software Storage Area 20650*c* (FIG. 1130) of Device A, which displays house layout data on LCD 201 (FIG. 1) of Device A. Referring to the present drawing, CPU 211 (FIG. 1) of Device A retrieves the house layout data from House Layout Data Storage Area 20650*b*1*a*3 (FIG. 1053) (S1), and displays the data on LCD 201 (FIG. 1) (S2).

FIG. 1136 illustrates Room Layout Data Displaying Software 20650*c*6 stored in House Item Pin-pointing Software Storage Area 20650*c* (FIG. 1130) of Device A, which displays room layout data on LCD 201 (FIG. 1) of Device A. Referring to the present drawing, CPU 211 (FIG. 1) of Device A retrieves the room layout data from Room Layout Data Storage Area 20650*b*1*a*4 (FIG. 1053) (S1) and displays the data on LCD 201 (FIG. 1) (S2).

FIGS. 1137 through 1143 illustrate the method to display the house item icons on LCD 201 (FIG. 1) of Communication Device 200.

FIG. 1137 illustrates House Item List Displaying Software 20650*c*6*a* stored in House Item Pin-pointing Software Storage Area 20650*c* (FIG. 1130) of Device A. Referring to the present drawing, CPU 211 (FIG. 1) of Device A retrieves the house item IDs, the house item icon image data, and the house item name data from House Item Icon Image Data Storage Area 20650*b*1*a*5 (FIG. 1053) (S1). CPU 211 then displays on LCD 201 (FIG. 1) a list of the house items including these data (S2).

FIG. 1138 illustrates House Item Selecting Software 20650*c*7 stored in House Item Pin-pointing Software Storage Area 20650*c* (FIG. 1130) of Device A, which selects a house item from the house item list displayed on LCD 201 (FIG. 1) of Device A. Referring to the present drawing, a house item which is to be located by implementing the present function is selected from the list displayed in S2 of FIG. 1137 by utilizing Input Device 210 (FIG. 1) or via voice recognition system (S1). CPU 211 (FIG. 1) then stores the selected house item ID in Selected House Item ID Storage Area 20650*b*3 (FIG. 1051) (S2).

FIG. 1139 illustrates Selected House Item Finding Software 20650*c*21 stored in House Item Pin-pointing Software Storage Area 20650*c* (FIG. 1130) of Device A, which finds the house item selected by House Item Selecting Software 20650*c*7 described in FIG. 1138. Referring to the present drawing, CPU 211 (FIG. 1) of Device A receives the ID signals from all house items via relays described in FIGS. 1027 through 1030 (S1). Here, the ID signals are the signals emitted from the relays representing their identifications. Device A then detects the selected house item (S2).

FIG. 1140 illustrates Row GPS Data Sending/Receiving Software 20650*c*19 stored in House Item Pin-pointing Software Storage Area 20650*c* (FIG. 1130) of Device A and Row GPS Data Sending/Receiving Software HI50*c*19 stored in House Item Pin-pointing Software Storage Area HI50*c* (FIG. 1131*a*) of House Item HI (FIG. 1151), which respectively sends and receives Row GPS Data 50RGD. Referring to the present drawing, House Item HI retrieves Row GPS Data 50RGD from the relays described in FIGS. 1027 through 1030 (S1), and sends Row GPS Data 50RGD to Device A (S2). Device A then receives Row GPS Data 50RGD (S3), and stores the data in Work Area 20650*b*2 (FIG. 1051) (S4).

FIG. 1141 illustrates the data included in Row GPS Data 50RGD described in FIG. 1140. Referring to the present drawing, Row GPS Data 50RGD comprises a relay ID and a row GPS data. Here, the relay ID is the identification of the relay and the row GPS data is a primitive data utilized to produce a calculated GPS data. Assuming that House Item HI, Glasses 50GL (FIG. 1022) for example, is placed in Room A. As described in FIG. 1027, four relays, i.e., R50A1, R50A2, R50A3, and R50A4 are installed in Room A. House Item HI (Glasses 50GL) receives four Row GPS Data 50RGD, each of which from R50A1, R50A2, R50A3, and R50A4, respectively, namely, the first Row GPS Data 50RGD of which the relay ID is R50A1 and of which the row GPS data is the one received from relay R50A1; the second Row GPS Data 50RGD of which the relay ID is R50A2 and of which the row GPS data is the one received from relay R50A2; the third Row GPS Data 50RGD of which the relay ID is R50A3 and of which the row GPS data is the one received from relay R50A3; and the fourth Row GPS Data 50RGD of which the relay ID is R50A4 and of which the row GPS data is the one received from relay R50A4.

FIG. 1142 illustrates GPS Data Calculating Software 20650*c*20 stored in House Item Pin-pointing Software Storage Area 20650*c* (FIG. 1130) of Device A, which produces a calculated GPS data. Referring to the present drawing, Device A produces the calculated GPS data by utilizing a plurality of Row GPS Data 50RGD stored in Work Area 20650*b*2 (FIG. 1051) (S1), and stores the calculated GPS data in Work Area 20650*b*2 (S2). Here, the calculated GPS data is the data representing the location of House Item HI, Glasses 50GL (FIG. 1022) for example, in (x, y, z) format.

FIG. 1143 illustrates Selected House Item Displaying Software 20650*c*12 stored in House Item Pin-pointing Software Storage Area 20650*c* (FIG. 1130) of Device A, which displays the location of the house item selected by House Item Selecting Software 20650*c*7 described in FIG. 1138. Referring to the present drawing, CPU 211 (FIG. 1) of Device A retrieves the calculated GPS Data from Work Area 20650*b*2 (FIG. 1051) (S1) and further retrieves the house item icon image data from House Item Icon Image Data Storage Area 20650*b*1*a*5 (FIG. 1053) by referring to the selected house item ID stored in Selected House Item ID Storage Area 20650*b*3 (FIG. 1051) (S2). CPU 211 then displays the house item icon image data on LCD 201 (FIG. 1) at the location corresponding to the calculated GPS data stored in S2 of FIG. 1142 (S3).

FIGS. 1144 through 1150 illustrate the method to display the communication device icons on LCD 201 (FIG. 1) of Communication Device 200.

FIG. 1144 illustrates Com. Device List Displaying Software 20650*c*12*a* stored in House Item Pin-pointing Software Storage Area 20650*c* (FIG. 1130) of Device A. Referring to the present drawing, CPU 211 (FIG. 1) of Device A retrieves the communication device IDs, the communication device icon image data, and the user name data from Com. Device Icon Image Data Storage Area 20650*b*1*a*6 (FIG. 1083) (S1). CPU 211 then displays on LCD 201 (FIG. 1) a list of the communication devices including these data (S2).

FIG. 1145 illustrates Com. Device Selecting Software 20650*c*13 stored in House Item Pin-pointing Software Storage Area 20650*c* (FIG. 1130) of Device A, which selects a communication device from the communication device list displayed on LCD 201 (FIG. 1) of Device A. Referring to the present drawing, a communication device which is to be located by implementing the present function is selected from the list displayed in S2 of FIG. 1144 by utilizing Input Device 210 (FIG. 1) or via voice recognition system (S1). CPU 211 (FIG. 1) then stores the selected communication device ID in Selected Com. Device ID Storage Area 20650*b*4 (FIG. 1051) (S2).

FIG. 1146 illustrates Selected Com. Device Finding Software 20650*c*15 stored in House Item Pin-pointing Software Storage Area 20650*c* (FIG. 1130) of Device A, which finds the communication device selected by Com. Device Selecting Software 20650*c*13 described in FIG. 1145. Referring to the present drawing, Device A receives the ID signals from all communication devices via relays described in FIGS. 1027 through 1030 (S1). Here, the ID signals are the signals emitted from the relays representing their identifications. Device A then detects the selected communication device (S2).

FIG. 1147 illustrates Row GPS Data Sending/Receiving Software 20650*c*19 stored in House Item Pin-pointing Software Storage Area 20650*c* (FIG. 1130) of Device A and Row GPS Data Sending/Receiving Software 20650*c*19 stored in House Item Pin-pointing Software Storage Area 20650*c* (FIG. 1131) of Device B, which respectively sends and receives Row GPS Data 50RGD. Referring to the present drawing, Device B retrieves Row GPS Data 50RGD from the relays described in FIGS. 1027 through 1030 (S1), and sends Row GPS Data 50RGD to Device A (S2). Device A then receives Row GPS Data 50RGD (S3), and stores the data in Work Area 20650*b*2 (FIG. 1040) (S4).

FIG. 1148 illustrates the data included in Row GPS Data 50RGD described in FIG. 1147. Referring to the present drawing, Row GPS Data 50RGD comprises a relay ID and a row GPS data. Here, the relay ID is the identification of the relay and the row GPS data is a primitive data utilized to produce a calculated GPS data. Assuming that House Item HI, Glasses 50GL (FIG. 1022) for example, is placed in Room A. As described in FIG. 1027, four relays, i.e., R50A1, R50A2, R50A3, and R50A4 are installed in Room A. House Item HI (Glasses 50GL) receives four Row GPS Data 50RGD, each of which from R50A1, R50A2, R50A3, and R50A4, respectively, namely, the first Row GPS Data 50RGD of which the relay ID is R50A1 and of which the row GPS data is the one received from relay R50A1; the second Row GPS Data 50RGD of which the relay ID is R50A2 and of which the row GPS data is the one received from relay R50A2; the third Row GPS Data 50RGD of which the relay ID is R50A3 and of which the row GPS data is the one received from relay R50A3; and the fourth Row GPS Data 50RGD of which the relay ID is R50A4 and of which the row GPS data is the one received from relay R50A4.

FIG. 1149 illustrates GPS Data Calculating Software 20650*c*20 stored in House Item Pin-pointing Software Storage Area 20650*c* (FIG. 1130) of Device A, which produces a calculated GPS data. Referring to the present drawing, Device A produces the calculated GPS data by utilizing a plurality of Row GPS Data 50RGD stored in Work Area 20650*b*2 (FIG. 1040) (S1), and stores the calculated GPS data in Work Area 20650*b*2 (S2). Here, the calculated GPS data is the data representing the location of House Item HI, Glasses 50GL (FIG. 1022) for example, in (x, y, z) format.

FIG. 1150 illustrates Selected Com. Device Displaying Software 20650*c*18 stored in House Item Pin-pointing Software Storage Area 20650*c* (FIG. 1130) of Device A, which displays the location of the communication device selected by Com. Device Selecting Software 20650*c*13 described in FIG. 1145. Referring to the present drawing, CPU 211 (FIG. 1) of Device A retrieves the calculated GPS Data from Work Area 20650*b*2 (FIG. 1051) (S1) and further retrieves the communication device icon image data from Com. Device Icon Image Data Storage Area 20650*b*1*a*6 (FIG. 1053) by referring to the selected communication device ID stored in Selected Com. Device ID Storage Area 20650*b*4 (FIG. 1051) (S2). CPU 211 of Device A then displays the communication device icon image data on LCD 201 (FIG. 1) at the location corresponding to the calculated GPS data stored in S2 of FIG. 1149 (S3).

<<House Item Pin-Pointing Function—House Item HI>>

FIGS. 1151 through 1154 illustrate the data and software programs included in House Item HI. Here, House Item HI is any item placed in a house, such as Glasses 50GL (FIG. 1022), Book 50BK (FIG. 1023), Pen 50PN (FIG. 1024), and Nail Clipper 50NC (FIG. 1025), with a small transmitter attached thereto or embedded therein (e.g., Wireless Transmitter 50GLa (FIG. 1022), Wireless Transmitter 50BKa (FIG. 1023), Wireless Transmitter 50PNa (FIG. 1024), and Wireless Transmitter 50NCa (FIG. 1025)).

FIG. 1151 illustrates the storage area included in House Item HI. As described in the present drawing, House Item HI includes House Item Pin-pointing Information Storage Area HI50*a* of which the data and the software programs stored therein are described in 1152.

FIG. 1152 illustrates the storage areas included in House Item Pin-pointing Information Storage Area HI50*a* (FIG. 1151). As described in the present drawing, House Item Pin-pointing Information Storage Area HI50*a* includes House Item Pin-pointing Data Storage Area HI50*b* and House Item Pin-pointing Software Storage Area HI50*c*. House Item Pin-pointing Data Storage Area HI50*b* stores the data necessary to implement the present function on the side of House Item HI (FIG. 1151), such as the ones described hereinbefore. House Item Pin-pointing Software Storage Area HI50*c* stores the software programs necessary to implement the present function on the side of House Item HI, such as the ones described hereinbefore.

<<House Item Pin-Pointing Function—Summary>>

(1) A computer comprising a microphone, a speaker, a display, an input device and a multiple mode implementor, wherein said multiple mode implementor implements a voice communication mode and a house item pin-pointing mode, a series of audio data are input to and output from said microphone and said speaker respectively when said voice communication mode is implemented, a house item location which represents the location of an house item existing in a house is displayed on said display when said house item pin-pointing mode is implemented.

(2) A house item pin-pointing software which displays a house item location which represents the location of an house item existing in a house on a display of a computer by retrieving location data representing the location of said house item in said house.

(3) A house item pin-pointing system comprising a computer and a house item wherein a house item location which represents the location of an house item existing in a house is displayed on a display of said computer by retrieving location data representing the location of said house item in said house.

(4) Said display further displays the location of said computer.

<<Membership Administrating Function>>

FIGS. 1153 through 1188 illustrate the membership administrating function in which Host H (FIG. 429) allows only the users of Communication Device 200 who have paid the monthly fee to access Host H to implement the function(s). Here, the function(s) for purposes of implementing the present function include any and all functions described in this specification which are implemented by accessing Host H and/or which require to access Host H to implement thereof. The present function may be implemented prior to the functions described in this specification which are implemented by accessing Host H and/or which require to access Host H to implement thereof.

FIG. 1153 illustrates the storage area included in Host H (FIG. 429). As described in the present drawing, Host H includes Membership Administrating Information Storage Area H51*a* of which the data and the software programs stored therein are described in FIG. 1154.

FIG. 1154 illustrates the storage areas included in Membership Administrating Information Storage Area H51*a* (FIG. 1153). As described in the present drawing, Membership Administrating Information Storage Area H51*a* includes Membership Administrating Data Storage Area H51*b* and Membership Administrating Software Storage Area H51*c*. Membership Administrating Data Storage Area H51*b* stores the data necessary to implement the present function on the side of Host H (FIG. 429), such as the ones described in FIGS. 1155 through 1159. Membership Administrating Software Storage Area H51*c* stores the software programs necessary to implement the present function on the side of Host H, such as the ones described in FIG. 1160.

FIG. 1155 illustrates the storage areas included in Membership Administrating Data Storage Area H51*b* (FIG. 1154). As described in the present drawing, Membership Administrating Data Storage Area H51*b* (FIG. 1154) includes Payment Status Data Storage Area H51*b*1, Password Data Storage Area H51*b*2, Service Type Data Storage Area H51*b*3, Users' Service Type Data Storage Area H51*b*4, and Authentication Request Storage Area H51*b*5. Payment Status Data Storage Area H51*b*1 stores the data described in FIG. 1156. Password Data Storage Area H51*b*2 stores the data described in FIG. 1157. Service Type Data Storage Area H51*b*3 stores the data described in FIG. 1158. Users' Service Type Data Storage Area H51*b*4 stores the data described in FIG. 1159. Authentication Request Storage Area H51*b*5 stores Authentication Request 51AR sent from Communication Device 200 described in FIG. 1171.

FIG. 1156 illustrates the data stored in Payment Status Data Storage Area H51*b*1 (FIG. 1155). As described in the present drawing, Payment Status Data Storage Area H51*b*1 comprises two columns, i.e., 'User ID' and 'Payment Status Data'. Column 'User ID' stores the user IDs, and each user ID represents the identification of the user of Communication Device 200. Column 'Payment Status Data' stores the payment status data, and each payment status data represents the payment status of the monthly fee of the user of the corresponding user ID. The payment status is identified by either "1" or "0" wherein "1" indicates that the monthly fee is duly paid and "0" indicates that the monthly fee is not duly paid. In the example described in the present drawing, the following data are stored in Payment Status Data Storage Area H51*b*1: the user ID 'User #1' of which the corresponding payment status data is '1'; the user ID 'User #2' of which the corresponding payment status data is '1'; the user ID 'User #3' of which the corresponding payment status data is '0'; and the user ID 'User #4' of which the corresponding payment status data is '1'.

FIG. 1157 illustrates the data stored in Password Data Storage Area H51*b*2 (FIG. 1155). As described in the present drawing, Password Data Storage Area H51*b*2 comprises two columns, i.e., 'User ID' and 'Password Data'. Column 'User ID' stores the user IDs, and each user ID represents the identification of the user of Communication Device 200. Column 'Password Data' stores the password data, and each password data represents the password created by the user of the corresponding user ID. In the example described in the present drawing, Password Data Storage Area H51*b*2 stores the following data: user ID 'User #1' of which the corresponding password data is 'Password #1'; user ID 'User #2' of which the corresponding password data is 'Password #2'; user ID 'User #3' of which the corresponding password data is 'Password #3'; and user ID 'User #4' of which the corresponding password data is 'Password #4'. The password data may be any alphanumeric data of any length.

FIG. 1158 illustrates the data stored in Service Type Data Storage Area H51*b*3 (FIG. 1155). As described in the present drawing, Service Type Data Storage Area H51*b*3 comprises two columns, i.e., 'Service Type ID' and 'Available Service Type Data'. Column 'Service Type ID' stores the service type ID, and each service type ID represents the identification of the available service type data stored in column 'Available Service Type Data'. Column 'Available Service Type Data' stores the available service type data, and each available service type data represents the types of the functions available to the user of Communication Device 200. In the example described in the present drawing, Service Type Data Storage Area H51*b*3 stores the following data: service type ID 'Service Type A' of which the functions available to the user of Communication Device 200 are 'All Functions'; service type ID 'Service Type B' of which the functions available to the user of Communication Device 200 are 'Function #1, #2, #3'; and service type ID 'Service Type C' of which the functions available to the user of Communication Device 200 are 'Function #1, #2, #3, #4, #5, #6'. Here, 'All Functions' means all functions described in this specification, and each function labeled as "#1", "#2", "#3", "#4", "#5", and "#6" may be any function described in the specification.

FIG. 1159 illustrates the data stored in Users' Service Type Data Storage Area H51*b*4 (FIG. 1155). As described in the present drawing, Users' Service Type Data Storage Area H51*b*4 comprises two columns, i.e., 'User ID' and 'Users' Service Type Data'. Column 'User ID' stores the user IDs, and each user ID represents the identification of the user of Communication Device 200. Column 'Users' Service Type Data' stores the users' service type data, and each user's service type data represents the service type available to the user of the corresponding user ID. In the example described in the present drawing, Users' Service Type Data Storage Area H51*b*4 stores the following data: user ID 'User #1' of which the corresponding user's service type data is 'Service Type A'; user ID 'User #2' of which the corresponding user's service type data is 'Service Type A'; user ID 'User #3' of which the corresponding user's service type data is 'Service Type B'; and user ID 'User #4' of which the corresponding user's service type data is 'Service Type C'. Referring to FIGS. 1158 and 1159, the user whose user ID is 'User #1' can enjoy all functions described in this specification; the user whose user ID is 'User #2' can enjoy all functions described in this specification; the user whose user ID is 'User #3' may enjoy functions #1, #2, and #3 (i.e., three functions described in this specification); and the user whose user ID is 'User #4' may enjoy all functions #1, #2, #3, #4, #5, and #6 (i.e., predetermined six functions described in this specification).

FIG. 1160 illustrates the software programs stored in Membership Administrating Software Storage Area H51*c* (FIG. 1154). As described in the present drawing, Membership Administrating Software Storage Area H51*c* stores Authentication Request Receiving Software H51*c*3, 1st Authentication Processing Software H51*c*4, 2nd Authentication Processing Software H51*c*5, 3rd Authentication Processing Software H51*c*6, and Payment Status Updating Software H51*c*7. Authentication Request Receiving Software H51*c*3 is the software program described in FIG. 1172. 1st Authentication Processing Software H51*c*4 is the software program described in FIG. 1173. 2nd Authentication Processing Software H51*c*5 is the software program described in FIG. 1174. 3rd Authentication Processing Software H51*c*6 is the software program described in FIG. 1187. Payment Status Updating Software H51*c*7 is the software program described in FIG. 1175.

FIG. 1161 illustrates the storage area included in RAM 206 (FIG. 1) of the individual Communication Device 200. As described in the present drawing, RAM 206 includes Membership Administrating Information Storage Area 20651*a* of which the data and the software programs stored therein are described in FIG. 1162.

The data and software programs stored in Membership Administrating Information Storage Area 20651*a* (FIG. 1161) are downloaded from Host H (FIG. 429) in the manner described in FIGS. 401 through 407.

FIG. 1162 illustrates the storage areas included in Membership Administrating Information Storage Area 20651*a* (FIG. 1161). As described in the present drawing, Membership Administrating Information Storage Area 20651*a* includes Membership Administrating Data Storage Area 20651*b* and Membership Administrating Software Storage Area 20651*c*. Membership Administrating Data Storage Area 20651*b* stores the data necessary to implement the present function on the side of Communication Device 200, such as the ones described in FIGS. 1163 through 1167. Membership Administrating Software Storage Area 20651*c* stores the software programs necessary to implement the present function on the side of Communication Device 200, such as the ones described in FIG. 1168.

FIG. 1163 illustrates the storage areas included in Membership Administrating Data Storage Area 20651*b* (FIG. 1162). As described in the present drawing, Membership Administrating Data Storage Area 20651*b* (FIG. 1162) includes Payment Status Data Storage Area 20651*b*1, Password Data Storage Area 20651*b*2, Service Type Data Storage Area 20651*b*3, User's Service Type Data Storage Area 20651*b*4, and Available Function Data Storage Area 20651*b*5. Payment Status Data Storage Area 20651*b*1 stores the data described in FIG. 1164. Password Data Storage Area 20651*b*2 stores the data described in FIG. 1165. User's Service Type Data Storage Area 20651*b*4 stores the data described in FIG. 1166. Available Function Data Storage Area 20651*b*5 stores the data described in FIG. 1167.

FIG. 1164 illustrates the data included in Payment Status Data Storage Area 20651*b*1 (FIG. 1163). As described in the present drawing, Payment Status Data Storage Area 20651*b*1 comprises two columns, i.e., 'User ID' and 'Payment Status Data'. Column 'User ID' stores the user ID which represents the identification of the individual user of Communication Device 200. Column 'Payment Status Data' stores the payment status data which represents the payment status of the monthly fee of the user. The payment status is identified by either "1" or "0" wherein "1" indicates that the monthly fee is duly paid and "0" indicates that the monthly fee is not duly paid. In the example described in the present drawing, the following data are stored in Payment Status Data Storage Area H51*b*1: the user ID 'User #1' of which the corresponding payment status data is '1'. These data indicate that the user ID of the individual user of Communication Device 200 is 'User #1' and the user has duly paid the monthly fee.

FIG. 1165 illustrates the data stored in Password Data Storage Area 20651*b*2 (FIG. 1163). As described in the present drawing, Password Data Storage Area 20651*b*2 comprises two columns, i.e., 'User ID' and 'Password Data'. Column 'User ID' stores the user ID which represents the identification of the user of Communication Device 200. Column 'Password Data' stores the password data which represents the password created by the user. In the example described in the present drawing, Password Data Storage Area 20651*b*2 stores the following data: user ID 'User #1' of which the corresponding password data is 'Password #1'. These data indicate that the user ID of this individual user of Communication Device 200 is 'User #1' and his/her password is 'Password #1'. The password data may be any alphanumeric data of any length.

FIG. 1166 illustrates the data stored in User's Service Type Data Storage Area 20651*b*4 (FIG. 1163). As described in the present drawing, User's Service Type Data Storage Area 20651*b*4 comprises two columns, i.e., 'User ID' and 'User's Service Type Data'. Column 'User ID' stores the user ID which represents the identification of the individual user of Communication Device 200. Column 'User's Service Type Data' stores the user's service type data which represents the service type available to the user. In the example described in the present drawing, User's Service Type Data Storage Area 20651*b*4 stores the following data: user ID 'User #1' of which the corresponding user's service type data is 'Service Type A'. Referring to FIGS. 1158 and 1166, the user ID of Communication Device 200 is 'User #1', and he/she can enjoy all functions described in this specification.

FIG. 1167 illustrates the data stored in Available Function Data Storage Area 20651*b*5 (FIG. 1163). As described in the present drawing, Available Function Data Storage Area 20651*b*5 comprises one column, i.e., 'Function ID'. Column 'Function ID' stores the function IDs, and each function ID represents the identification of the function described in this specification. In the present example, the user's service type data stored in User's Service Type Data Storage Area 20651*b*4 (FIG. 1166) is 'Service Type A', therefore, the function IDs of all functions described in this specification are stored in Available Function Data Storage Area 20651*b*5.

FIG. 1168 illustrates the software programs stored in Membership Administrating Software Storage Area 20651*c* (FIG. 1162). As described in the present drawing, Membership Administrating Software Storage Area 20651*c* stores Function Selecting Software 20651*c*1 and Authentication Request Sending Software 20651*c*2. Function Selecting Software 20651*c*1 is the software program described in FIG. 1169. Authentication Request Sending Software 20651*c*2 is the software program described in FIG. 1170.

FIG. 1169 illustrates Function Selecting Software 20651*c*1 stored in Membership Administrating Software Storage Area 20651*c* (FIG. 1168) of Communication Device 200, which enables the user of Communication Device 200 to select function(s) from a function list displayed on LCD 201 (FIG. 1). Referring to the present drawing, CPU 211 (FIG. 1) retrieves the available function data from Available Function Data Storage Area 20651*b*5 (FIG. 1163), and crerates a function list therefrom (S1). The function list is displayed on LCD 201 (S2), and one or more functions to be implemented are selected from the list by utilizing Input Device 210 (FIG. 1) or via voice recognition system (S3).

FIG. 1170 illustrates Authentication Request Sending Software 20651*c*2 stored in Membership Administrating Software Storage Area 20651*c* (FIG. 1168) of Communication Device 200, which sends to Host H (FIG. 429) an authentication request. Referring to the present drawing, CPU 211 (FIG. 1) sends Authentication Request 51AR To Host H (S1).

FIG. 1171 illustrates the data included in Authentication Request 51AR described in FIG. 1170. As described in the present drawing, Authentication Request 51AR includes the user ID and the function ID. Here, the user ID is the one retrieved from column 'User ID' of Payment Status Data Storage Area 20651*b*1 (FIG. 1164), i.e., 'User #1'. The function ID is the one selected in S3 of FIG. 1169.

FIG. 1172 illustrates Authentication Request Receiving Software H51*c*3 stored in Membership Administrating Software Storage Area H51*c* (FIG. 1160) of Host H (FIG. 429), which receives Authentication Request 51AR (FIG. 1171) sent from Communication Device 200. Referring to the present drawing, Host H receives Authentication Request 51AR (FIG. 1171) (S1), which is stored in Authentication Request Storage Area H51*b*5 (FIG. 1155) (S2).

FIG. 1173 illustrates 1st Authentication Processing Software H51*c*4 stored in Membership Administrating Software Storage Area H51*c* (FIG. 1160) of Host H (FIG. 429), which identifies the payment status of the user of Communication Device 200. Referring to the present drawing, Host H retrieves the user ID from Authentication Request Storage Area H51*b*5 (FIG. 1155) (S1). Host H then refers to Payment Status Data Storage Area H51*b*1 (FIG. 1156) (S2). If the payment status data stored therein is '1' (S3), Host H activates 2nd Authentication Processing Software H51*c*5 (FIG. 1160) of which the sequence is described in FIG. 1174 (S4).

FIG. 1174 illustrates 2nd Authentication Processing Software H51*c*5 stored in Membership Administrating Software Storage Area H51*c* (FIG. 1160) of Host H (FIG. 429), which identifies the functions available to the specific Communication Device 200. Referring to the present drawing, Host H retrieves the user ID from Authentication Request Storage Area H51*b*5 (FIG. 1155) (S1). Host H then identifies the user's service type data by referring to Users' Service Type Data Storage Area H51*b*4 (FIG. 1159) (S2). Host H further identifies the available service type data by referring to Service Type Data Storage Area H51*b*3 (FIG. 1158) (S3). The function ID is retrieved from Authentication Request Storage Area H51*b*5 (FIG. 1155) (S4), and if the function identified by the function ID is the one which is available (S5), Host H proceeds with implementing the function (S6).

FIG. 1175 illustrates Payment Status Updating Software H51*c*7 stored in Membership Administrating Software Storage Area H51*c* (FIG. 1160) of Host H (FIG. 429), which updates the payment status of the user of Communication Device 200. Referring to the present drawing, Host H checks the payment status (S1). If the monthly fee is paid (S2), Host H registers the payment status data as '1' (S3*a*) and registers the payment status data as '0' (S3*b*) if the monthly fee is not paid. This sequence is executed for all user IDs stored in Payment Status Data Storage Area H51*b*1 (FIG. 1156) periodically, such as on the first day of each month or on the last day of each month.

FIG. 1176 illustrates another embodiment of Payment Status Updating Software H51*c*7 stored in Membership Administrating Software Storage Area H51*c* (FIG. 1160) of Host H (FIG. 429), which updates the payment status of the user of Communication Device 200. Referring to the present drawing, Host H checks the payment status (S1). If the monthly fee is paid (S2), Host H registers the payment status data as '1' (S4*a*). Even though the monthly fee is not paid (S2), if the grace period has not yet passed (S3), Host H registers the payment status data as '1' (S4*a*). If the monthly fee is not yet paid (S2) and the grace period has passed (S3), Host H registers the payment status data as '0' (S4*b*). This sequence is executed for all user IDs stored in Payment Status Data Storage Area H51*b*1 (FIG. 1156) periodically, such as on the first day of each month or on the last day of each month.

<<Membership Administrating Function—Another Embodiment01>>

FIGS. 1177 through 1181 illustrate another embodiment of the present function wherein the authentication process is rendered only by referring to the user ID.

FIG. 1177 illustrates Function Selecting Software 20651*c*1 stored in Membership Administrating Software Storage Area 20651*c* (FIG. 1168) of Communication Device 200, which enables the user of Communication Device 200 to select function(s) from a function list displayed on LCD 201 (FIG. 1). Referring to the present drawing, CPU 211 (FIG. 1) retrieves the available function data from Available Function Data Storage Area 20651*b*5 (FIG. 1167), and crerates a function list therefrom (S1). The function list is displayed on LCD 201 (S2), and one or more functions to be implemented are selected from the list by utilizing Input Device 210 (FIG. 1) or via voice recognition system (S3).

FIG. 1178 illustrates Authentication Request Sending Software 20651*c*2 stored in Membership Administrating Software Storage Area 20651*c* (FIG. 1168) of Communication Device 200, which sends to Host H (FIG. 429) an authentication request. Referring to the present drawing, CPU 211 (FIG. 1) sends Authentication Request 51AR To Host H (S1).

FIG. 1179 illustrates the data included in Authentication Request 51AR described in FIG. 1178. As described in the present drawing, Authentication Request 51AR includes the user ID. Here, the user ID is the one retrieved from column 'User ID' of Payment Status Data Storage Area 20651*b*1 (FIG. 1164), i.e., 'User #1'.

FIG. 1180 illustrates Authentication Request Receiving Software H51*c*3 stored in Membership Administrating Software Storage Area H51*c* (FIG. 1160) of Host H (FIG. 429), which receives Authentication Request 51AR (FIG. 1179) sent from Communication Device 200. Referring to the present drawing, Host H receives Authentication Request 51AR (FIG. 1179) (S1), which is stored in Authentication Request Storage Area H51*b*5 (FIG. 1155) (S2).

FIG. 1181 illustrates 1st Authentication Processing Software H51*c*4 stored in Membership Administrating Software Storage Area H51*c* (FIG. 1160) of Host H (FIG. 429), which identifies the payment status of the user of Communication Device 200. Referring to the present drawing, Host H retrieves the user ID from Authentication Request Storage Area H51*b*5 (FIG. 1155) (S1). Host H then refers to Payment Status Data Storage Area H51*b*1 (FIG. 1156) (S2). If the payment status data stored therein is '1' (S3), Host H proceeds with implementing the function (S4).

<<Membership Administrating Function—Another Embodiment02>>

FIGS. 1182 through 1188 illustrate another embodiment of the present function wherein the authentication process is rendered by referring to the user ID and the password.

FIG. 1182 illustrates Function Selecting Software 20651*c*1 stored in Membership Administrating Software Storage Area 20651*c* (FIG. 1168) of Communication Device 200, which enables the user of Communication Device 200 to select function(s) from a function list displayed on LCD 201 (FIG. 1). Referring to the present drawing, CPU 211 (FIG. 1) retrieves the available function data from Available Function Data Storage Area 20651*b*5 (FIG. 1167), and crerates a function list therefrom (S1). The function list is displayed on LCD 201 (S2), and one or more functions to be implemented are selected from the list by utilizing Input Device 210 (FIG. 1) or via voice recognition system (S3). The user ID and the password are input by utilizing Input Device 210 (FIG. 1) or via voice recognition system (S4).

FIG. 1183 illustrates Authentication Request Sending Software 20651*c*2 stored in Membership Administrating Software Storage Area 20651*c* (FIG. 1168) of Communication Device 200, which sends to Host H (FIG. 429) an authentication request. Referring to the present drawing, CPU 211 (FIG. 1) sends Authentication Request 51AR To Host H (S1).

FIG. 1184 illustrates the data included in Authentication Request 51AR described in FIG. 1183. As described in the present drawing, Authentication Request 51AR includes the user ID, the function ID, and the password data. Here, the user ID and the password data are the ones input in S4 of FIG. 1182. The function ID is the one selected in S3 of FIG. 1182.

FIG. 1185 illustrates Authentication Request Receiving Software H51*c*3 stored in Membership Administrating Software Storage Area H51*c* (FIG. 1160) of Host H (FIG. 429), which receives Authentication Request 51AR (FIG. 1171) sent from Communication Device 200. Referring to the present drawing, Host H receives Authentication Request 51AR (FIG. 1171) (S1), which is stored in Authentication Request Storage Area H51*b*5 (FIG. 1155) (S2).

FIG. 1186 illustrates 1st Authentication Processing Software H51*c*4 stored in Membership Administrating Software Storage Area H51*c* (FIG. 1160) of Host H (FIG. 429), which identifies the payment status of the user of Communication Device 200. Referring to the present drawing, Host H retrieves the user ID from Authentication Request Storage Area H51*b*5 (FIG. 1155) (S1). Host H then refers to Payment Status Data Storage Area H51*b*1 (FIG. 1156) (S2). If the payment status data stored therein is '1' (S3), Host H activates 3rd Authentication Processing Software H51*c*6 (FIG. 1160) of which the sequence is described in FIG. 1187 (S4).

FIG. 1187 illustrates 3rd Authentication Processing Software H51*c*6 stored in Membership Administrating Software Storage Area H51*c* (FIG. 1160) of Host H (FIG. 429), which identifies the authenticity of the user ID and the password input in S4 of FIG. 1182. Referring to the present drawing, Host H retrieves the user ID from Authentication Request Storage Area H51*b*5 (FIG. 1155) (S1). Host H then retrieves the password data from Authentication Request Storage Area H51*b*5 (FIG. 1155) (S2). If the user ID and the password data described in S1 and S2 are correct by referring to Password Data Storage Area H51*b*2 (FIG. 1157) (S3), Host H activates 2nd Authentication Processing Software H51*c*5 (FIG. 1160) of which the sequence is described in FIG. 1188 (S4). For the avoidance of doubt, 3rd Authentication Processing Software H51*c*6 described in the present drawing may be executed prior to the execution of 1st Authentication Processing Software H51*c*4 described in FIG. 1186.

FIG. 1188 illustrates 2nd Authentication Processing Software H51*c*5 stored in Membership Administrating Software Storage Area H51*c* (FIG. 1160) of Host H (FIG. 429), which identifies the functions available to the specific Communication Device 200. Referring to the present drawing, Host H retrieves the user ID from Authentication Request Storage Area H51*b*5 (FIG. 1155) (S1). Host H then identifies the user's service type data by referring to Users' Service Type Data Storage Area H51*b*4 (FIG. 1159) (S2). Host H further identifies the available service type data by referring to Service Type Data Storage Area H51*b*3 (FIG. 1158) (S3). The function ID is retrieved from Authentication Request Storage Area H51*b*5 (FIG. 1155) (S4), and if the function identified by the function ID is the one which is available (S5), Host H proceeds with implementing the function (S6).

<<Keyword Search Timer Recording Function>>

FIGS. 1189 through 1254 illustrate the keyword search timer recording function which enables to timer record TV programs which meet a certain criteria set by the user of Communication Device 200. The present function is another embodiment of the timer video recording function described in FIGS. 88 through 135 (more particularly in FIGS. 113 through 118 and/or FIG. 135).

FIG. 1189 illustrates the storage area included in Host H (FIG. 429). As described in the present drawing, Host H (FIG. 429) includes Keyword Search Timer Recording Information Storage Area H52*a* of which the data and software programs stored therein are described in FIG. 1190.

FIG. 1190 illustrates the storage areas included in Keyword Search Timer Recording Information Storage Area H52*a* (FIG. 1189). As described in the present drawing, Keyword Search Timer Recording Information Storage Area H52*a* includes Keyword Search Timer Recording Data Storage Area H52*b* and Keyword Search Timer Recording Software Storage Area H52*c*. Keyword Search Timer Recording Data Storage Area H52*b* stores the data necessary to implement the present function on the side of Host H (FIG. 429), such as the ones described in FIGS. 1191 through 1199. Keyword Search Timer Recording Software Storage Area H52*c* stores the software programs necessary to implement the present function on the side of Host H, such as the ones described in FIG. 1200.

FIG. 1191 illustrates the storage areas included in Keyword Search Timer Recording Data Storage Area H52*b* (FIG. 1190). As described in the present drawing, Keyword Search Timer Recording Data Storage Area H52*b* includes TV Program Data Storage Area H52*b*1, TV Program Time Frame Data Storage Area H52*b*2, TV Program Channel Data Storage Area H52*b*3, TV Program Actors/Actresses Data Storage Area H52*b*4, TV Program Category Data Storage Area H52*b*5, TV Program Summary Data Storage Area H52*b*6, and Timer Recording TV Program Relating Data Storage Area 20652*b*7. TV Program Data Storage Area H52*b*1 stores the data described in FIG. 1192. TV Program Time Frame Data Storage Area H52*b*2 stores the data described in FIG. 1193. TV Program Channel Data Storage Area H52*b*3 stores the data described in FIG. 1195. TV Program Actors/Actresses Data Storage Area H52*b*4 stores the data described in FIG. 1196. TV Program Category Data Storage Area H52*b*5 stores the data described in FIG. 1197. TV Program Summary Data Storage Area H52*b*6 stores the data described in FIG. 1198. Timer Recording TV Program Relating Data Storage Area 20652*b*7 stores the data described in FIG. 1199.

FIG. 1192 illustrates the data stored in TV Program Data Storage Area H52*b*1 (FIG. 1190). As described in the present drawing, TV Program Data Storage Area H52*b*1 comprises two columns, i.e., 'TV Program ID' and 'TV Program Data'. Column 'TV Program ID' stores the TV program IDs, and each TV program ID is the identification of the corresponding TV program data stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200. The TV program IDs and the TV program data are pre-stored in TV Program Data Storage Area H52*b*1. In the example described in the present drawing, TV Program Data Storage Area H52*b*1 stores the following data: the TV program ID 'TV Program #1' of which the corresponding TV program data is 'TV Program Data #1'; the TV program ID 'TV Program #2' of which the corresponding TV program data is 'TV Program Data #2'; the TV program ID 'TV Program #3' of which the corresponding TV program data is 'TV Program Data #3'; the TV program ID 'TV Program #4' of which the corresponding TV program data is 'TV Program Data #4'; the TV program ID 'TV Program #5' of which the corresponding TV program data is 'TV Program Data #5'; and the TV program ID 'TV Program #6' of which the corresponding TV program data is 'TV Program Data #6'. Here, the TV program data may be of any TV program, such as science fiction, situation comedy, news, and documentary.

FIG. 1193 illustrates the data stored in TV Program Time Frame Data Storage Area H52*b*2 (FIG. 1190). As described in the present drawing, TV Program Time Frame Data Storage Area H52*b*2 comprises three columns, i.e., 'TV Program ID', 'TV Program Time Frame Data #1', and 'TV Program Time Frame Data #2'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'TV Program Time Frame Data #2' stores the TV program time frame data #2, and each TV program time frame data #2 represents the starting time and the ending time of the re-run of the TV program represented by the corresponding TV program ID. In the example described in the present drawing, TV Program Time Frame Data Storage Area H52*b*2 stores the following data: the TV program ID 'TV Program #1' wherein the TV program time frame data #1 is '19:00-19:30' and the TV program time frame data #2 is '20:30-21:00'; the TV program ID 'TV Program #2' wherein the TV program time frame data #1 is '19:30-20:30' and the TV program time frame data #2 is 'Null'; the TV program ID 'TV Program #3' wherein the TV program time frame data #1 is '21:30-22:00' and the TV program time frame data #2 is 'Null'; the TV program ID 'TV Program #4' wherein the TV program time frame data #1 is '21:00-22:00' and the TV program time frame data #2 is 'Null'; the TV program ID 'TV Program #5' wherein the TV program time frame data #1 is '19:00-20:00' and the TV program time frame data #2 is '20:30-21:30'; and the TV program ID 'TV Program #6' wherein the TV program time frame data #1 is '20:00-20:30' and the TV program time frame data #2 is 'Null'.

FIG. 1194 illustrates another embodiment of the data stored in TV Program Time Frame Data Storage Area H52*b*2 (FIG. 1193). As described in the present drawing, TV Program Time Frame Data Storage Area H52*b*2 comprises three columns, i.e., 'TV Program ID', 'TV Program Time Frame Data #1', and 'Re-run Flag'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'Re-run Flag' stores the re-run flag data, and each re-run flag data represents whether the TV program represented by the corresponding TV program ID is a re-run. The re-run flag data is represented by either '1' or '0' wherein '1' indicates that the corresponding TV program is a re-run, and '0' indicates that the corresponding TV program is not a re-run. In the example described in the present drawing, the following data are stored in TV Program Time Frame Data Storage Area H52*b*2: the TV program ID 'TV Program #1' wherein the TV program time frame data #1 is '19:00-19:30' and the re-run flag data is '0'; the TV program ID 'TV Program #2' wherein the TV program time frame data #1 is '19:30-20:30' and the re-run flag data is '0'; the TV program ID 'TV Program #3' wherein the TV program time frame data #1 is '21:30-22:00' and the re-run flag data is '0'; the TV program ID 'TV Program #4' wherein the TV program time frame data #1 is '21:00-22:00' and the re-run flag data is '0'; the TV program ID 'TV Program #5' wherein the TV program time frame data #1 is '19:00-20:00' and the re-run flag data is '0'; the TV program ID 'TV Program #6' wherein the TV program time frame data #1 is '20:00-20:30' and the re-run flag data is '0'; the TV program ID 'TV Program #1' wherein the TV program time frame data #1 is '20:30-21:00' and the re-run flag data is '1'; and the TV program ID 'TV Program #5' wherein the TV program time frame data #1 is '20:30-21:30' and the re-run flag data is '1'.

FIG. 1195 illustrates the data stored in TV Program Channel Data Storage Area H52*b*3 (FIG. 1190). As described in the present drawing, TV Program Channel Data Storage Area H52*b*3 comprises two columns, i.e., 'TV Program ID' and 'TV Program Channel Data'. Column 'TV Program ID' stores the TV program IDs which are described hereinbefore. Column 'TV Program Channel Data' stores the TV program channel data, and each TV program channel data represents the channel number of the TV program of the corresponding TV program ID. In the example described in the present drawing, TV Program Channel Data Storage Area H52*b*3 stores the following data: the TV program ID 'TV Program #1' of which the TV program channel data is 'Ch 1'; the TV program ID 'TV Program #2' of which the TV program channel data is 'Ch 1'; the TV program ID 'TV Program #3' of which the TV program channel data is 'Ch 2'; the TV program ID 'TV Program #4' of which the TV program channel data is 'Ch 1'; the TV program ID 'TV Program #5' of which the TV program channel data is 'Ch 2'; and the TV program ID 'TV Program #6' of which the TV program channel data is 'Ch 2'.

FIG. 1196 illustrates the data stored in TV Program Actors/Actresses Data Storage Area H52*b*4 (FIG. 1190). As described in the present drawing, TV Program Actors/Actresses Data Storage Area H52*b*4 comprises two columns, i.e., 'TV Program ID' and 'Actors/Actresses Data'. Column 'TV Program ID' stores the TV program IDs which are described hereinbefore. Column 'Actors/Actresses Data' stores the actors/actresses data, and each actors/actresses data comprises alphanumeric data representing the names of the actors and/or the actresses who are acting in the TV program represented by the corresponding TV program ID. In the example described in the present drawing, TV Program Actors/Actresses Data Storage Area H52*b*4 stores the following data: the TV program ID 'TV Program #1' of which the actors/actresses data is 'Actor #1, Actress #2'; the TV program ID 'TV Program #2' of which the actors/actresses data is 'Actor #3, Actress #3, Actress #4'; the TV program ID 'TV Program #3' of which the actors/actresses data is 'Actress #5, Actress #6'; the TV program ID 'TV Program #4' of which the actors/actresses data is 'Actor #7, Actor #8'; the TV program ID 'TV Program #5' of which the actors/actresses data is 'Actress #9'; and the TV program ID 'TV Program #6' of which the actors/actresses data is 'Actor #10, Actor #11, Actress #12'. The actors/actresses data may be the name of any existing actor(s) and/or actress(es).

FIG. 1197 illustrates the data stored in TV Program Category Data Storage Area H52*b*5 (FIG. 1190). As described in the present drawing, TV Program Category Data Storage Area H52*b*5 comprises two columns, i.e., 'TV Program ID' and 'Category Data'. Column 'TV Program ID' stores the TV program IDs which are described hereinbefore. Column 'Category Data' stores the category data, and each category data comprises alphanumeric data representing the category to which each TV program data of the corresponding TV program ID pertains. In the example described in the present drawing, TV Program Category Data Storage Area H52*b*5 stores the following data: the TV program ID 'TV Program #1' and the corresponding category data 'Science Fiction'; the TV program ID 'TV Program #2' and the corresponding category data 'Situation Comedy'; the TV program ID 'TV Program #3' and the corresponding category data 'News'; the TV program ID 'TV Program #4' and the corresponding category data 'Documentary'; the TV program ID 'TV Program #5' and the corresponding category data 'Science Fiction'; and the TV program ID 'TV Program #6' and the corresponding category data 'Situation Comedy'.

FIG. 1198 illustrates the data stored in TV Program Summary Data Storage Area H52*b*6 (FIG. 1190). As described in the present drawing, TV Program Summary Data Storage Area H52*b*6 comprises two columns, i.e., 'TV Program ID' and 'Summary Data'. Column 'TV Program ID' stores the TV program IDs which are described hereinbefore. Column 'Summary Data' stores the summary data, and each summary data comprises alphanumeric data representing the summary of the TV program of the corresponding TV program ID. In the example described in the present drawing, TV Program Summary Data Storage Area H52*b*6 stores the following data: the TV program ID 'TV Program #1' and the corresponding summary data 'Summary #1'; the TV program ID 'TV Program #2' and the corresponding summary data 'Summary #2'; the TV program ID 'TV Program #3' and the corresponding summary data 'Summary #3'; the TV program ID 'TV Program #4' and the corresponding summary data 'Summary #4'; the TV program ID 'TV Program #5' and the corresponding summary data 'Summary #5'; and the TV program ID 'TV Program #6' and the corresponding summary data 'Summary #6'.

FIG. 1199 illustrates the data stored in Timer Recording TV Program Relating Data Storage Area H52*b*7 (FIG. 1190). As described in the present drawing, Timer Recording TV Program Relating Data Storage Area H52*b*7 stores the timer recording TV program relating data of each user. The timer recording TV program relating data comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200.

FIG. 1200 illustrates the software programs stored in Keyword Search Timer Recording Software Storage Area H52*c* (FIG. 1190). As described in the present drawing, Keyword Search Timer Recording Software Storage Area H52*c* stores Keyword Search Timer Recording Data Sending Software H52*c*2 and Timer Recording Software H52*c*7. Keyword Search Timer Recording Data Sending Software H52*c*2 is the software program described in FIG. 1214. Timer Recording Software H52*c*7 is the software program described in FIGS. 1220*a* and 1220*b*.

FIG. 1201 illustrates the storage area included in RAM 206 (FIG. 1) of Communication Device 200. As described in the present drawing, RAM 206 includes Keyword Search Timer Recording Information Storage Area 20652*a* of which the data and software programs stored therein are described in FIG. 1202.

FIG. 1202 illustrates the storage areas included in Keyword Search Timer Recording Information Storage Area 20652*a* (FIG. 1201). As described in the present drawing, Keyword Search Timer Recording Information Storage Area 20652*a* includes Keyword Search Timer Recording Data Storage Area 20652*b* and Keyword Search Timer Recording Software Storage Area 20652*c*. Keyword Search Timer Recording Data Storage Area 20652*b* stores the data necessary to implement the present function on the side of Communication Device 200, such as the ones described in FIGS. 1203 through 1211. Keyword Search Timer Recording Software Storage Area 20652*c* stores the software programs necessary to implement the present function on the side of Communication Device 200, such as the ones described in FIG. 1212.

The software programs stored in Keyword Search Timer Recording Software Storage Area 20652*c* (FIG. 1202) are downloaded from Host H (FIG. 429) in the manner described in FIGS. 401 through 407.

FIG. 1203 illustrates the storage areas included in Keyword Search Timer Recording Data Storage Area 20652*b* (FIG. 1202). As described in the present drawing, Keyword Search Timer Recording Data Storage Area 20652*b* includes TV Program Time Frame Data Storage Area 20652*b*2, TV Program Channel Data Storage Area 20652*b*3, TV Program Actors/Actresses Data Storage Area 20652*b*4, TV Program Category Data Storage Area 20652*b*5, TV Program Summary Data Storage Area 20652*b*6, and Timer Recording TV Program Relating Data Storage Area 20652*b*7. TV Program Time Frame Data Storage Area 20652*b*2 stores the data described in FIG. 1204. TV Program Channel Data Storage Area 20652*b*3 stores the data described in FIG. 1206. TV Program Actors/Actresses Data Storage Area 20652*b*4 stores the data described in FIG. 1208. TV Program Category Data Storage Area 20652*b*5 stores the data described in FIG. 1209. TV Program Summary Data Storage Area 20652*b*6 stores the data described in FIG. 1210. Timer Recording TV Program Relating Data Storage Area 20652*b*7 stores the data described in FIG. 1211.

FIG. 1204 illustrates the data stored in TV Program Time Frame Data Storage Area 20652*b*2 (FIG. 1202). As described in the present drawing, TV Program Time Frame Data Storage Area 20652*b*2 comprises three columns, i.e., 'TV Program ID', 'TV Program Time Frame Data #1', and 'TV Program Time Frame Data #2'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'TV Program Time Frame Data #2' stores the TV program time frame data #2, and each TV program time frame data #2 represents the starting time and the ending time of the re-run of the TV program represented by the corresponding TV program ID. In the example described in the present drawing, TV Program Time Frame Data Storage Area **20652*b*2** stores the following data: the TV program ID 'TV Program #1' wherein the TV program time frame data #1 is '19:00-19:30' and the TV program time frame data #2 is '20:30-21:00'; the TV program ID 'TV Program #2' wherein the TV program time frame data #1 is '19:30-20:30' and the TV program time frame data #2 is 'Null'; the TV program ID 'TV Program #3' wherein the TV program time frame data #1 is '21:30-22:00' and the TV program time frame data #2 is 'Null'; the TV program ID 'TV Program #4' wherein the TV program time frame data #1 is '21:00-22:00' and the TV program time frame data #2 is 'Null'; the TV program ID 'TV Program #5' wherein the TV program time frame data #1 is '19:00-20:00' and the TV program time frame data #2 is '20:30-21:30'; and the TV program ID 'TV Program #6' wherein the TV program time frame data #1 is '20:00-20:30' and the TV program time frame data #2 is 'Null'.

FIG. 1205 illustrates another embodiment of the data stored in TV Program Time Frame Data Storage Area **20652*b*2 (FIG. 1204). As described in the present drawing, TV Program Time Frame Data Storage Area 20652*b*2 comprises three columns, i.e., 'TV Program ID', 'TV Program Time Frame Data #1', and 'Re-run Flag'. Column 'TV Program ID' stores the TV program IDs, and each TV program ID is the identification of the corresponding TV program time frame data #1 stored in column 'TV Program Time Frame Data #1'. Column 'TV Program Time Frame Data #1' stores the TV program time frame data #1, and each TV program time frame data #1 represents the starting time and the ending time of the TV program represented by the corresponding TV program ID. Column 'Re-run Flag' stores the re-run flag data, and each re-run flag data represents whether the TV program represented by the corresponding TV program ID is a re-run. The re-run flag data is represented by either '1' or '0' wherein '1' indicates that the corresponding TV program is a re-run, and '0' indicates that the corresponding TV program is not a re-run. In the example described in the present drawing, the following data are stored in TV Program Time Frame Data Storage Area 20652*b*2**: the TV program ID 'TV Program #1' wherein the TV program time frame data #1 is '19:00-19:30' and the re-run flag data is '0'; the TV program ID 'TV Program #2' wherein the TV program time frame data #1 is '19:30-20:30' and the re-run flag data is '0'; the TV program ID 'TV Program #3' wherein the TV program time frame data #1 is '21:30-22:00' and the re-run flag data is '0'; the TV program ID 'TV Program #4' wherein the TV program time frame data #1 is '21:00-22:00' and the re-run flag data is '0'; the TV program ID 'TV Program #5' wherein the TV program time frame data #1 is '19:00-20:00' and the re-run flag data is '0'; the TV program ID 'TV Program #6' wherein the TV program time frame data #1 is '20:00-20:30' and the re-run flag data is '0'; the TV program ID 'TV Program #1' wherein the TV program time frame data #1 is '20:30-21:00' and the re-run flag data is '1'; and the TV program ID 'TV Program #5' wherein the TV program time frame data #1 is '20:30-21:30' and the re-run flag data is '1'.

FIG. 1206 illustrates the data stored in TV Program Channel Data Storage Area **20652*b*3 (FIG. 1202). As described in the present drawing, TV Program Channel Data Storage Area 20652*b*3 comprises two columns, i.e., 'TV Program ID' and 'TV Program Channel Data'. Column 'TV Program ID' stores the TV program IDs which are described hereinbefore. Column 'TV Program Channel Data' stores the TV program channel data, and each TV program channel data represents the channel number of the TV program of the corresponding TV program ID. In the example described in the present drawing, TV Program Channel Data Storage Area 20652*b*3** stores the following data: the TV program ID 'TV Program #1' of which the TV program channel data is 'Ch 1'; the TV program ID 'TV Program #2' of which the TV program channel data is 'Ch 1'; the TV program ID 'TV Program #3' of which the TV program channel data is 'Ch 2'; the TV program ID 'TV Program #4' of which the TV program channel data is 'Ch 1'; the TV program ID 'TV Program #5' of which the TV program channel data is 'Ch 2'; and the TV program ID 'TV Program #6' of which the TV program channel data is 'Ch 2'.

FIG. 1207 illustrates the TV program listing displayed on LCD 201 (FIG. 1). As described in the present drawing, the TV program listing reflects the data stored in TV Program Time Frame Data Storage Area **20652*b*2 (FIGS. 1204 and/or 1205) and TV Program Channel Data Storage Area 20652*b*3 (FIG. 1206**).

FIG. 1208 illustrates the data stored in TV Program Actors/Actresses Data Storage Area **20652*b*4 (FIG. 1202). As described in the present drawing, TV Program Actors/Actresses Data Storage Area 20652*b*4 comprises two columns, i.e., 'TV Program ID' and 'Actors/Actresses Data'. Column 'TV Program ID' stores the TV program IDs which are described hereinbefore. Column 'Actors/Actresses Data' stores the actors/actresses data, and each actors/actresses data comprises alphanumeric data representing the names of the actors and/or the actresses who are acting in the TV program represented by the corresponding TV program ID. In the example described in the present drawing, TV Program Actors/Actresses Data Storage Area 20652*b*4** stores the following data: the TV program ID 'TV Program #1' of which the actors/actresses data is 'Actor #1, Actress #2'; the TV program ID 'TV Program #2' of which the actors/actresses data is 'Actor #3, Actress #3, Actress #4'; the TV program ID 'TV Program #3' of which the actors/actresses data is 'Actress #5, Actress #6'; the TV program ID 'TV Program #4' of which the actors/actresses data is 'Actor #7, Actor #8'; the TV program ID 'TV Program #5' of which the actors/actresses data is 'Actress #9'; and the TV program ID 'TV Program #6' of which the actors/actresses data is 'Actor #10, Actor #11, Actress #12'. The actors/actresses data may be the name of any existing actor(s) and/or actress(es).

FIG. 1209 illustrates the data stored in TV Program Category Data Storage Area **20652*b*5 (FIG. 1202). As described in the present drawing, TV Program Category Data Storage Area 20652*b*5 comprises two columns, i.e., 'TV Program ID' and 'Category Data'. Column 'TV Program ID' stores the TV program IDs which are described hereinbefore. Column 'Category Data' stores the category data, and each category data comprises alphanumeric data representing the category to which each TV program data of the corresponding TV program ID pertains. In the example described in the present drawing, TV Program Category Data Storage Area 20652*b*5 stores the following data: the TV program ID 'TV Program #1' and the corresponding category data 'Science Fiction'; the TV program ID 'TV Program #2' and the corresponding category data 'Situation Comedy'; the TV program ID 'TV Program #3' and the corresponding category data 'News'; the TV program ID 'TV Program #4' and the corresponding category data 'Documentary'; the TV program ID 'TV Program #5' and the corresponding category data 'Science Fiction'; and the TV program ID 'TV Program #6**' and the corresponding category data 'Situation Comedy'.

FIG. 1210 illustrates the data stored in TV Program Summary Data Storage Area **20652*b*6 (FIG. 1202). As described in the present drawing, TV Program Summary Data Storage Area 20652*b*6 comprises two columns, i.e., 'TV Program ID' and 'Summary Data'. Column 'TV Program ID' stores the TV program IDs which are described hereinbefore. Column 'Summary Data' stores the summary data, and each summary data comprises alphanumeric data representing the summary of the TV program of the corresponding TV program ID. In the example described in the present drawing, TV Program Summary Data Storage Area 20652*b*6 stores the following data: the TV program ID 'TV Program #1' and the corresponding summary data 'Summary #1'; the TV program ID 'TV Program #2' and the corresponding summary data 'Summary #2'; the TV program ID 'TV Program #3' and the corresponding summary data 'Summary #3'; the TV program ID 'TV Program #4' and the corresponding summary data 'Summary #4'; the TV program ID 'TV Program #5' and the corresponding summary data 'Summary #5'; and the TV program ID 'TV Program #6' and the corresponding summary data 'Summary #6**'.

FIG. 1211 illustrates the data stored in Timer Recording TV Program Relating Data Storage Area **20652*b*7 (FIG. 1202). As described in the present drawing, Timer Recording TV Program Relating Data Storage Area 20652*b*7 stores the timer recording TV program relating data. The timer recording TV program relating data comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200. A plurality of timer recording TV program relating data can be stored in Timer Recording TV Program Relating Data Storage Area 20652*b*7**.

FIG. 1212 illustrates the software programs stored in Keyword Search Timer Recording Software Storage Area **20652*c* (FIG. 1202). As described in the present drawing, Keyword Search Timer Recording Software Storage Area 20652*c* stores Keyword Search Timer Recording Data Request Sending Software 20652*c*1, Keyword Search Timer Recording Data Receiving Software 20652*c*3, Timer Recording Setting By Actors/Actresses Software 20652*c*4, Timer Recording Setting By Category Software 20652*c*5, Re-run Avoiding Process Software 20652*c*6, Timer Recording Software 20652*c*7, Timer Recording Notification Displaying Software 20652*c*8, TV Program Data Selecting Software 20652*c*10, and TV Program Data Replaying Software 20652*c*11. Keyword Search Timer Recording Data Request Sending Software 20652*c*1 is the software program described in FIG. 1213. Keyword Search Timer Recording Data Receiving Software 20652*c*3 is the software program described in FIG. 1215. Timer Recording Setting By Actors/Actresses Software 20652*c*4 is the software program described in FIG. 1216. Timer Recording Setting By Category Software 20652*c*5 is the software program described in FIG. 1217. Re-run Avoiding Process Software 20652*c*6 is the software program described in FIG. 1218. Timer Recording Software 20652*c*7 is the software program described in FIGS. 1220*a* and 1220*b*. Timer Recording Notification Displaying Software 20652*c*8 is the software program described in FIG. 1221. TV Program Data Selecting Software 20652*c*10 is the software program described in FIG. 1221*a*. TV Program Data Replaying Software 20652*c*11 is the software program described in FIG. 1221*b***.

FIG. 1213 illustrates Keyword Search Timer Recording Data Request Sending Software **20652*c*1 stored in Keyword Search Timer Recording Software Storage Area 20652*c* (FIG. 1212) of Communication Device 200, which sends the keyword search timer recording data request to Host H (FIG. 429). Referring to the present drawing, CPU 211 (FIG. 1) of Communication Device 200 sends the keyword search timer recording data request to Host H (S1). Here, the keyword search timer recording data request is a request signal which requests to send back the keyword search timer recording data stored in Keyword Search Timer Recording Data Storage Area H52*b* (FIG. 1191**) of Host H.

FIG. 1214 illustrates Keyword Search Timer Recording Data Sending Software H**52*c*2 stored in Keyword Search Timer Recording Software Storage Area H52*c* (FIG. 1200) of Host H (FIG. 429), which sends the keyword search timer recording data to Communication Device 200. Referring to the present drawing, Host H, upon receiving the keyword search timer recording data request from Communication Device 200 (S1), retrieves the keyword search timer recording data from Keyword Search Timer Recording Data Storage Area H52*b* (FIG. 1191), excluding the data stored in TV Program Data Storage Area H52*b*1 (FIG. 1192). The data stored in Timer Recording TV Program Relating Data Storage Area H52*b*7 (FIG. 1199**) are also retrieved, however, only of the ones of the corresponding user ID.

FIG. 1215 illustrates Keyword Search Timer Recording Data Receiving Software **20652*c*3 stored in Keyword Search Timer Recording Software Storage Area 20652*c* (FIG. 1212) of Communication Device 200, which receives and stores the keyword search timer recording data sent from Host H (FIG. 429). Referring to the present drawing, CPU 211 (FIG. 1) of Communication Device 200 receives the keyword search timer recording data from Host H (S1). CPU 211 then stores the data in Keyword Search Timer Recording Data Storage Area 20652*b* (FIG. 1203) (S2**).

FIG. 1216 illustrates Timer Recording Setting By Actors/Actresses Software **20652*c*4 stored in Keyword Search Timer Recording Software Storage Area 20652*c* (FIG. 1212) of Communication Device 200, which sets the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 searches TV Program Actors/Actresses Data Storage Area 20652*b*4 (FIG. 1208) (S3), and identifies the TV program IDs of the TV programs having the actors and/or actresses identified in S2 acting therein, as well as implementing the re-run avoiding process (S4). The re-run avoiding process is the process described in FIGS. 1218 and 1219. CPU 211 identifies the corresponding TV program channel data and the TV program time frame data #1 of each TV program ID by referring to TV Program Channel Data Storage Area 20652*b*3 (FIG. 1206) and TV Program Time Frame Data Storage Area 20652*b*2 (FIGS. 1204 and/or 1205), and stores the TV program IDs, the TV program channel data, and the TV program time frame data #1 (collectively referred to as the 'timer recording setting data' hereinafter) in Timer Recording TV Program Relating Data Storage Area 20652*b*7 (FIG. 1211) (S5). The timer recording setting data is displayed on LCD 201 (S6**).

FIG. 1217 illustrates Timer Recording Setting By Category Software **20652*c*5 stored in Keyword Search Timer Recording Software Storage Area 20652*c* (FIG. 1212) of Communication Device 200, which sets the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 searches TV Program Category Data Storage Area 20652*b*5 (FIG. 1209) (S3), and identifies the TV program IDs of the TV programs pertaining to the categories identified in S2, as well as implementing the re-run avoiding process (S4). The re-run avoiding process is the process described in FIGS. 1218 and 1219. CPU 211 identifies the corresponding TV program channel data and the TV program time frame data #1 of each TV program ID by referring to TV Program Channel Data Storage Area 20652*b*3 (FIG. 1206) and TV Program Time Frame Data Storage Area 20652*b*2 (FIGS. 1204 and/or 1205), and stores the TV program IDs, the TV program channel data, and the TV program time frame data #1 (i.e., timer recording setting data) in Timer Recording TV Program Relating Data Storage Area 20652*b*7 (FIG. 1211) (S5). The timer recording setting data is displayed on LCD 201 (S6**).

FIG. 1218 illustrates Re-run Avoiding Process Software **20652*c*6 stored in Keyword Search Timer Recording Software Storage Area 20652*c* (FIG. 1212) of Communication Device 200, which avoids selecting the re-runs of the TV programs which are already selected. Referring to the present drawing, CPU 211 (FIG. 1) searches column 'TV Program Time Frame Data #1' of TV Program Time Frame Data Storage Area 20652*b*2 described in FIG. 1204 (S1). The re-runs are avoided from being selected by prohibiting to search column 'TV Program Time Frame Data #2**'.

FIG. 1219 illustrates another embodiment of Re-run Avoiding Process Software **20652*c*6 stored in Keyword Search Timer Recording Software Storage Area 20652*c* (FIG. 1212) of Communication Device 200, which avoids selecting the re-runs of the TV programs which are already selected. Referring to the present drawing, CPU 211 (FIG. 1) searches column 'Re-run Flag Data' of TV Program Time Frame Data Storage Area 20652*b*2 described in FIG. 1205 (S1). If the re-run flag data is '1' (S2), CPU 211 prohibits the corresponding TV program data to be timer recorded (S3). In the example described in FIG. 1205, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5** on-aired on 20:30-21:00 and 20:30-21:30 respectively are refrained from being timer recorded.

FIGS. **1220*a* and 1220*b* illustrate Timer Recording Software H52*c*7 stored in Keyword Search Timer Recording Software Storage Area H52*c* (FIG. 1200) of Host H (FIG. 429) and Timer Recording Software 20652*c*7 stored in Keyword Search Timer Recording Software Storage Area 20652*c* (FIG. 1212) of Communication Device 200, which implement the timer recording in accordance to the settings described in FIGS. 1216 and/or 1217. Referring to the present drawing, CPU 211 (FIG. 1) of Communication Device 200 retrieves the TV program time frame data from Timer Recording TV Program Relating Data Storage Area 20652*b*7 (FIG. 1211) (S1). If the time frame data matches with the current time (S2), CPU 211 sends the corresponding TV program data downloading request to Host H (S3). Upon receiving the corresponding TV program data downloading request from Communication Device 200 (S4), Host H retrieves the corresponding TV program data from TV Program Data Storage Area H52*b*1 (FIG. 1192) (S5), and sends the data to Communication Device 200 (S6). CPU 211 receives the corresponding TV program data from Host H (S7), and stores the corresponding TV program data in Timer Recording TV Program Relating Data Storage Area 20652*b*7 (FIG. 1211) (S8). CPU 211 then registers the corresponding record completed flag data (of Timer Recording TV Program Relating Data Storage Area 20652*b*7 (FIG. 1211)) as '1' (S9**).

FIG. 1221 illustrates Timer Recording Notification Displaying Software **20652*c*8 stored in Keyword Search Timer Recording Software Storage Area 20652*c* (FIG. 1212) of Communication Device 200, which displays a notification on LCD 201 (FIG. 1) when a new TV program data is recorded. Referring to the present drawing, CPU 211 of Communication Device 200 periodically checks the status of TV Timer Recording TV Program Relating Data Storage Area 20652*b*7 (FIG. 1211) (S1). If a new TV program data stored (S2), CPU 211 displays the timer recording notification on LCD 201 (FIG. 1) which indicates that a new TV program data is recorded (S3**).

FIG. **1221*a* illustrates TV Program Data Selecting Software 20652*c*10 stored in Keyword Search Timer Recording Software Storage Area 20652*c* (FIG. 1212) of Communication Device 200, which selects the TV program data to be replayed. Referring to the present drawing, CPU 211 (FIG. 1) of Communication Device 200 retrieves the timer recording TV program relating data from Timer Recording TV Program Relating Data Storage Area 20652*b*7 (FIG. 1211) (S1), and displays a list of the timer recording TV program relating data on LCD 201 (FIG. 1) (S2). The TV program data to be replayed is selected therefrom by utilizing Input Device 210 (FIG. 1) or via voice recognition system (S3**).

FIG. **1221*b* illustrates TV Program Data Replaying Software 20652*c*11 stored in Keyword Search Timer Recording Software Storage Area 20652*c* (FIG. 1212) of Communication Device 200, which replays the TV program data selected in S3 of FIG. 1221*a*. Referring to the present drawing, CPU 211 (FIG. 1) of Communication Device 200 replayes the TV program data (S1), and outputs visual data and audio data from LCD 201 (FIG. 1) and Speaker 216 (FIG. 1), respectively (S2). Here, the entire TV program data may be downloaded before being replayed or, as another embodiment, the replay process described in S5 may be initiated as soon as a replayable portion of the TV program data is downloaded. The portion of the TV program data which is replayed may be stored for the next replay, or as another embodiment, be erased from Communication Device 200**.

<<Keyword Search Timer Recording Function—Another Embodiment01>>

FIGS. 1222 through 1233 illustrate another embodiment of the present function wherein the timer recording setting is implemented by Communication Device 200 whereas the timer recording is implemented by Host H (FIG. 429).

FIG. 1222 illustrates the software programs stored in Keyword Search Timer Recording Software Storage Area H52*c* (FIG. 1190) of Host H (FIG. 429). As described in the present drawing, Keyword Search Timer Recording Software Storage Area H52*c* stores Timer Recording Setting By Actors/Actresses Software H52*c*4, Timer Recording Setting By Category Software H52*c*5, Re-run Avoiding Process Software H52*b*6, Timer Recording Software H52*c*7, Timer Recording Notification Displaying Software H52*c*8, Timer Recording TV Program Relating Data Request Sending Software H52*c*9, and TV Program Data Replaying Software H52*c*11. Timer Recording Setting By Actors/Actresses Software H52*c*4 is the software program described in FIGS. 1224*a* and 1224*b*. Timer Recording Setting By Category Software H52*c*5 is the software program described in FIGS. 1225*a* and 1225*b*. Re-run Avoiding Process Software H52*b*6 is the software program described in FIGS. 1226 and 1227. Timer Recording Software H52*c*7 is the software program described in FIGS. 1228 and 1229. Timer Recording Notification Displaying Software H52*c*8 is the software program described in FIG. 1230. Timer Recording TV Program Relating Data Request Sending Software H52*c*9 is the software program described in FIG. 1231. TV Program Data Replaying Software H52*c*11 is the software program described in FIG. 1233.

FIG. 1223 illustrates the software programs stored in Keyword Search Timer Recording Software Storage Area 20652*c* (FIG. 1202) of Communication Device 200. As described in the present drawing, Keyword Search Timer Recording Software Storage Area 20652*c* stores Timer Recording Setting By Actors/Actresses Software 20652*c*4, Timer Recording Setting By Category Software 20652*c*5, Timer Recording Software 20652*c*7, Timer Recording Notification Displaying Software 20652*c*8, Timer Recording TV Program Relating Data Request Sending Software 20652*c*9, TV Program Data Selecting Software 20652*c*10, and TV Program Data Replaying Software 20652*c*11. Timer Recording Setting By Actors/Actresses Software 20652*c*4 is the software program described in FIGS. 1224*a* and 1224*b*. Timer Recording Setting By Category Software 20652*c*5 is the software program described in FIGS. 1225*a* and 1225*b*. Timer Recording Software 20652*c*7 is the software program described in FIGS. 1229*a* and 1229*b*. Timer Recording Notification Displaying Software 20652*c*8 is the software program described in FIG. 1230. Timer Recording TV Program Relating Data Request Sending Software 20652*c*9 is the software program described in FIG. 1231. TV Program Data Selecting Software 20652*c*10 is the software program described in FIG. 1232. TV Program Data Replaying Software 20652*c*11 is the software program described in FIG. 1233.

FIGS. 1224*a* and 1224*b* illustrate Timer Recording Setting By Actors/Actresses Software H52*c*4 stored in Keyword Search Timer Recording Software Storage Area H52*c* (FIG. 1222) of Host H (FIG. 429) and Timer Recording Setting By Actors/Actresses Software 20652*c*4 stored in Keyword Search Timer Recording Software Storage Area 20652*c* (FIG. 1223) of Communication Device 200, which set the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 (FIG. 1) of Communication Device 200 sends the actors' and/or actresses' name data (S3), which is received by Host H (S4). Here, the actors' and/or actresses' name data is the alphanumeric data which represents the actors' and/or actresses' name input in S2. Host H searches TV Program Actors/Actresses Data Storage Area H52*b*4 (FIG. 1196) (S5), and identifies the TV program IDs of the TV programs having the actors and/or actresses identified in S2 acting therein, as well as implementing the re-run avoiding process (S6). The re-run avoiding process is the process described in FIGS. 1226 and 1227. Host H identifies the corresponding TV program channel data and the TV program time frame data #1 of each TV program ID by referring to TV Program Channel Data Storage Area H52*b*3 (FIG. 1195) and TV Program Time Frame Data Storage Area H52*b*2 (FIGS. 1193 and/or 1194), and stores the TV program IDs, the TV program channel data, and the TV program time frame data #1 (i.e., the timer recording setting data) in Timer Recording TV Program Relating Data Storage Area H52*b*7 (FIG. 1199) (S7). Host H then retrieves the foregoing data from Timer Recording TV Program Relating Data Storage Area H52*b*7 (FIG. 1199) (S8), which are sent to Communication Device 200 (S9). Communication Device 200 receives the data (S10), and stores them in Timer Recording TV Program Relating Data Storage Area 20652*b*7 (FIG. 1211) (S11). The data is displayed on LCD 201 (S12).

FIGS. 1225*a* and 1225*b* illustrate Timer Recording Setting By Category Software H52*c*5 stored in Keyword Search Timer Recording Software Storage Area H52*c* (FIG. 1222) of Host H (FIG. 429) and Timer Recording Setting By Category Software 20652*c*5 stored in Keyword Search Timer Recording Software Storage Area 20652*c* (FIG. 1223) of Communication Device 200, which set the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 (FIG. 1) sends the category data to Host H (S3). Here, the category data is the alphanumeric data which represents the category input in S2. Host H receives the category data from Communication Device 200 (S4), and searches TV Program Category Data Storage Area H52*b*5 (FIG. 1197) (S5). Host H then identifies the TV program IDs of the TV programs pertaining to the categories identified in S2, as well as implementing the re-run avoiding process (S6). The re-run avoiding process is the process described in FIGS. 1226 and 1227. Host H identifies the corresponding TV program channel data and the TV program time frame data #1 of each TV program ID by referring to TV Program Channel Data Storage Area H52*b*3 (FIG. 1195) and TV Program Time Frame Data Storage Area H52*b*2 (FIGS. 1193 and/or 1194), and stores the TV program IDs, the TV program channel data, and the TV program time frame data #1 (i.e., the timer recording setting data) in Timer Recording TV Program Relating Data Storage Area H52*b*7 (FIG. 1199) (S7). Host H retrieves the data from Timer Recording TV Program Relating Data Storage Area H52*b*7 (FIG. 1199) (S8), and sends them to Communication Device 200 (S9). CPU 211 receives the data (S10), and stores them in Timer Recording TV Program Relating Data Storage Area 20652*b*7 (FIG. 1211) (S11). The data are displayed on LCD 201 (S12).

FIG. 1226 illustrates Re-run Avoiding Process Software H52*b*6 stored in Keyword Search Timer Recording Software Storage Area H52*c* (FIG. 1222) of Host H (FIG. 429), which avoids selecting the re-runs of the TV programs which are already selected. Referring to the present drawing, Host H searches column 'TV Program Time Frame Data #1' of TV Program Time Frame Data Storage Area H52*b*2 described in FIG. 1193 (S1). The re-runs are avoided from being selected by prohibiting to search column 'TV Program Time Frame Data #2'.

FIG. 1227 illustrates another embodiment of Re-run Avoiding Process Software H52*b*6 stored in Keyword Search Timer Recording Software Storage Area H52*c* (FIG. 1222) of Host H (FIG. 429), which avoids selecting the re-runs of the TV programs which are already selected. Referring to the present drawing, Host H searches column 'Re-run Flag Data' of TV Program Time Frame Data Storage Area H52*b*2 described in FIG. 1194 (S1). If the re-run flag data is '1' (S2), Host H prohibits the corresponding TV program data to be timer recorded (S3). In the example described in FIG. 1194, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5 on-aired on 20:30-21:00 and 20:30-21:30 respectively are refrained from being timer recorded.

FIG. 1228 illustrates Timer Recording Software H52*c*7 stored in Keyword Search Timer Recording Software Storage Area H52*c* (FIG. 1222) of Host H (FIG. 429), which implements the timer recording in accordance to the settings described in FIGS. 1224 and/or 1225. Referring to the present drawing, Host H retrieves the TV program time frame data from Timer Recording TV Program Relating Data Storage Area H52*b*7 (FIG. 1199) (S1). If the time frame data matches with the current time (S2), Host H stores the corresponding TV program data in Timer Recording TV Program Relating Data Storage Area H52*b*7 (FIG. 1199) (S3). Host H then registers the corresponding record completed flag data (of Timer Recording TV Program Relating Data Storage Area H52*b*7 (FIG. 1199)) as '1' (S4).

FIGS. 1229*a* and 1229*b* illustrate another embodiment of Timer Recording Software H52*c*7 stored in Keyword Search Timer Recording Software Storage Area H52*c* (FIG. 1222) of Host H (FIG. 429) and Timer Recording Software 20652*c*7 stored in Keyword Search Timer Recording Software Storage Area 20652*c* (FIG. 1223) of Communication Device 200, which automatically download the TV program data to Timer Recording TV Program Relating Data Storage Area 20652*b*7 (FIG. 1211) of Communication Device 200 instead of storing the data in Host H as described in FIG. 1228. Referring to the present drawing, Host H retrieves the TV program time frame data from Timer Recording TV Program Relating Data Storage Area H52*b*7 (FIG. 1199) (S1). If the time frame data matches with the current time (S2), Host H sends the corresponding TV program data to Communication Device 200 (S3). Upon receiving the TV program data from Host H (S4), Communication Device 200 stores the TV program data in Timer Recording TV Program Relating Data Storage Area 20652*b*7 (FIG. 1211) (S5). Communication Device 200 registers the corresponding record completed flag data (of Timer Recording TV Program Relating Data Storage Area 20652*b*7 (FIG. 1211)) as '1' (S6). Host H then registers the corresponding record completed flag data (of Timer Recording TV Program Relating Data Storage Area H52*b*7 (FIG. 1199)) as '1' (S7).

FIG. 1230 illustrates Timer Recording Notification Displaying Software H52*c*8 stored in Keyword Search Timer Recording Software Storage Area H52*c* (FIG. 1222) of Host H (FIG. 429) and Timer Recording Notification Displaying Software 20652*c*8 stored in Keyword Search Timer Recording Software Storage Area 20652*c* (FIG. 1223) of Communication Device 200, which display a notification on LCD 201 (FIG. 1) when a new TV program data is recorded. Referring to the present drawing, Host periodically checks the status of TV Program Data Storage Area H52*b*1 (FIG. 1192) (S1). If a new TV program data stored (S2), Host H sends a timer recording notification to Communication Device 200 (S3). Here, the timer recording notification is a data which indicates that a new TV program data is recorded. Upon receiving the timer recording notification from Host H (S4), CPU 211 displays the timer recording notification on LCD 201 (FIG. 1) which indicates that a new TV program data is recorded (S5).

FIG. 1231 illustrates Timer Recording TV Program Relating Data Request Sending Software H52*c*9 stored in Keyword Search Timer Recording Software Storage Area H52*c* (FIG. 1222) of Host H (FIG. 429) and Timer Recording TV Program Relating Data Request Sending Software 20652*c*9 stored in Keyword Search Timer Recording Software Storage Area 20652*c* (FIG. 1223) of Communication Device 200, which sends and receives a timer recording TV program relating data request. Referring to the present drawing, Communication Device 200 sends the timer recording TV program relating data request (S1), which is received by Host H (S2). Here the timer recording TV program relating data request is a request to Host H for the timer recording TV program relating data to be sent to Communication Device 200. In response to the request, Host H retrieves the timer recording TV program relating data from Timer Recording TV Program Relating Data Storage Area H52*b*7 (FIG. 1199) of the corresponding user ID (S3), and sends the data to Communication Device 200 (S4). CPU 211 receives the timer recording TV program relating data from Host H (S5), and stores the data in Timer Recording TV Program Relating Data Storage Area 20652*b*7 (FIG. 1211) (S6).

FIG. 1232 illustrates TV Program Data Selecting Software 20652*c*10 stored in Keyword Search Timer Recording Software Storage Area 20652*c* (FIG. 1223) of Communication Device 200, which selects the TV program data to be replayed. Referring to the present drawing, CPU 211 (FIG. 1) retrieves the timer recording TV program relating data from Timer Recording TV Program Relating Data Storage Area 20652*b*7 (FIG. 1211) (S1), and displays a list of the timer recording TV program relating data on LCD 201 (FIG. 1) (S2). The TV program data to be replayed is selected therefrom by utilizing Input Device 210 (FIG. 1) or via voice recognition system (S3).

FIG. 1233 illustrates TV Program Data Replaying Software H52*c*11 stored in Keyword Search Timer Recording Software Storage Area H52*c* (FIG. 1222) of Host H (FIG. 429) and TV Program Data Replaying Software 20652*c*11 stored in Keyword Search Timer Recording Software Storage Area 20652*c* (FIG. 1223) of Communication Device 200, which replay the TV program data selected in S3 of FIG. 1232. Referring to the present drawing, CPU 211 (FIG. 1) sends the TV program ID of the TV program data selected in S3 of FIG. 12232 to Host H (S1). Upon receiving the TV Program ID from Communication Device 200 (S2), Host H sends the corresponding TV program data to Communication Device 200 (S3). Communication Device 200 receives the TV program data from Host H (S4), and replays the TV program data, and outputs video data and audio data from LCD 201 (FIG. 1) and Speaker 216, respectively (S5). Here, the entire TV program data may be downloaded before being replayed or, as another embodiment, the replay process described in S5 may be initiated as soon as a replayable portion of the TV program data is downloaded. The portion of the TV program data which is replayed may be stored for the next replay, or as another embodiment, be erased from Communication Device 200.

<<Keyword Search Timer Recording Function—Another Embodiment02>>

FIGS. 1234a and 1234b illustrate another embodiment of the foregoing embodiments of Timer Recording Software H52c7 stored in Keyword Search Timer Recording Software Storage Area H52c of Host H (FIG. 429) and Timer Recording Software 20652c7 stored in Keyword Search Timer Recording Software Storage Area 20652c of Communication Device 200, in which the timer recording is administered by Communication Device 200 whereas the TV program data is stored in Host H (instead of Communication Device 200). Referring to the present drawing, CPU 211 (FIG. 1) of Communication Device 200 retrieves the TV program time frame data from Timer Recording TV Program Relating Data Storage Area 20652b7 (FIG. 1211) (S1). If the time frame data matches with the current time (S2), CPU 211 sends the corresponding TV program data recording request to Host H (S3). Here, the corresponding TV program data recording request is a request to record the TV program data which is identified in S2. Upon receiving the corresponding TV program data recording request from Communication Device 200 (S4), Host H retrieves the corresponding TV program data from TV Program Data Storage Area H52b1 (FIG. 1192) (S5), and stores the data in Timer Recording TV Program Relating Data Storage Area H52b7 (FIG. 1199) of the corresponding user ID (S6). Host H then registers the corresponding record completed flag data (of Timer Recording TV Program Relating Data Storage Area H52b7 (FIG. 1199)) as '1' (S7). Host H sends the corresponding TV program data record completed notice (S8), which is received by Communication Device 200 (S9). CPU 211 registers the corresponding record completed flag data (of Timer Recording TV Program Relating Data Storage Area 20652b7 (FIG. 1211)) as '1' (S10).

<<Keyword Search Timer Recording Function—Another Embodiment0>>

FIGS. 1235 through 1241b illustrate another embodiment of the present function storing the TV program data in Personal Computer PC. Here, Personal Computer PC may be any type of personal computer including the ones described in this specification (excluding Host H (FIG. 429) and Communication Device 200).

FIG. 1235 illustrates the storage area included in Personal Computer PC. As described in the present drawing, Personal Computer PC includes Keyword Search Timer Recording Information Storage Area PC52a of which the data and the software programs stored therein are described in FIG. 1236.

FIG. 1236 illustrates the storage areas included in Keyword Search Timer Recording Information Storage Area PC52a (FIG. 1235). As described in the present drawing, Keyword Search Timer Recording Information Storage Area PC52a includes Keyword Search Timer Recording Data Storage Area PC52b and Keyword Search Timer Recording Software Storage Area PC52c. Keyword Search Timer Recording Data Storage Area PC52b stores the data necessary to implement the present function on the side of Personal Computer PC, such as the ones described in FIGS. 1237 and 1238. Keyword Search Timer Recording Software Storage Area PC52c stores the software programs necessary to implement the present function on the side of Personal Computer PC, such as the one described in FIG. 1239.

The software programs stored in Keyword Search Timer Recording Software Storage Area PC52c (FIG. 1236) are downloaded from Host H (FIG. 429) in the similar manner described in FIGS. 401 through 407.

FIG. 1237 illustrates the storage area included in Keyword Search Timer Recording Data Storage Area PC52b (FIG. 1236). As described in the present drawing, Keyword Search Timer Recording Data Storage Area PC52b includes Timer Recording TV Program Relating Data Storage Area PC52b7 of which the data stored therein are described in FIG. 1238.

FIG. 1238 illustrates the data stored in Timer Recording TV Program Relating Data Storage Area PC52b7. As described in the present drawing, Timer Recording TV Program Relating Data Storage Area PC52b7 comprises five columns, i.e., 'TV Program ID', 'TV Program Channel Data', 'TV Program Time Frame Data #1', 'Record Completed Flag Data', and 'TV Program Data'. Column 'TV Program ID' stores the TV program IDs which are described hereinbefore. Column 'TV Program Channel Data' stores the TV program channel data, and each TV program channel data represents the channel number of the TV program of the corresponding TV program ID. Column 'TV Program Time Frame Data #1' stores the TV program time frame data #1, and each TV program time frame data #1 represents the starting time and the ending time of the TV program represented by the corresponding TV program ID. Column 'Record Completed Flag Data' stores the record completed flag data, and each record completed flag data comprises either '1' or '0' wherein '1' indicates that the TV program data of the corresponding TV program ID is recorded and stored in column 'TV Program Data', and '0' indicates that the TV program data of the corresponding TV program ID is not recorded and stored in column 'TV Program Data'. Column 'TV Program Data' stores the TV program data, and each TV program data comprises audiovisual data representing a TV program designed to be broadcasted and/or displayed on LCD 201 (FIG. 1) of Communication Device 200.

FIG. 1239 illustrates the software program stored in Keyword Search Timer Recording Software Storage Area PC52c. As described in the present drawing, Keyword Search Timer Recording Software Storage Area PC52c stores Timer Recording Software PC52c7. Timer Recording Software PC52c7 is the software program described in FIGS. 1240a and 1240b.

FIGS. 1240a and 1240b illustrate Timer Recording Software H52c7 stored in Keyword Search Timer Recording Software Storage Area H52c of Host H (FIG. 429), Timer Recording Software 20652c7 stored in Keyword Search Timer Recording Software Storage Area 20652c of Communication Device 200, and Timer Recording Software PC52c7 stored in Keyword Search Timer Recording Software Storage Area PC52c (FIG. 1239), in which the timer recording is administered by Communication Device 200 whereas the TV program data is stored in Personal Computer PC (FIG. 1235) (instead of Communication Device 200 and/or Host H). Referring to the present drawing, CPU 211 (FIG. 1) of Communication Device 200 retrieves the TV program time frame data from Timer Recording TV Program Relating Data Storage Area 20652b7 (FIG. 1211) (S1). If the time frame data matches with the current time (S2), CPU 211 sends the corresponding TV program data recording request to Host H (S3). Here, the corresponding TV program data recording request is a request to record the TV program data which is identified in S2. Upon receiving the corresponding TV program data recording request from Communication Device 200 (S4), Host H retrieves the corresponding TV program data from TV Program Data Storage Area H52b1 (FIG. 1192) (S5), and sends the data to Personal Computer PC (FIG. 1235) (S6). Personal Computer PC stores the data in Timer Recording TV Program Relating Data Storage Area PC52b7 (FIG. 1238) (S7). Host H then registers the corresponding record completed flag data (of Timer Recording TV Program Relating Data Storage Area H52b7 (FIG. 1199)) as '1' (S8). Personal Computer PC registers the corresponding record completed flag data (of Timer Recording TV Program Relating Data Storage Area PC52*b*7 (FIG. 1238)) as '1' (S9). Host H sends the corresponding TV program data record completed notice (S10) and Personal Computer PC sends the corresponding TV program data record completed notice (S11), both of which are received by Communication Device 200 (S12). CPU 211 of Communication Device 200 registers the corresponding record completed flag data (of Timer Recording TV Program Relating Data Storage Area 20652*b*7 (FIG. 1211)) as '1' (S13).

FIGS. 1241*a* and 1241*b* illustrate another embodiment, described in FIGS. 1240*a* and 1240*b*, of Timer Recording Software H52*c*7 stored in Keyword Search Timer Recording Software Storage Area H52*c* of Host H (FIG. 429), Timer Recording Software 20652*c*7 stored in Keyword Search Timer Recording Software Storage Area 20652*c* of Communication Device 200, and Timer Recording Software PC52*c*7 stored in Keyword Search Timer Recording Software Storage Area PC52*c* (FIG. 1239) of Personal Computer PC, in which the timer recording is administered by Host H and the TV program data is stored in Personal Computer PC (FIG. 1235) (instead of Communication Device 200 and/or Host H). Referring to the present drawing, Host H retrieves the TV program time frame data from Timer Recording TV Program Relating Data Storage Area H52*b*7 (FIG. 1199) (S1). If the time frame data matches with the current time (S2), Host H sends the corresponding TV program data to Personal Computer PC (S3). Upon receiving the TV program data from Host H (S4), Personal Computer PC stores the data in Timer Recording TV Program Relating Data Storage Area PC52*b*7 (FIG. 1238) (S5). Host H then registers the corresponding record completed flag data (of Timer Recording TV Program Relating Data Storage Area H52*b*7 (FIG. 1199)) as '1' (S6). Personal Computer PC registers the corresponding record completed flag data (of Timer Recording TV Program Relating Data Storage Area PC52*b*7 (FIG. 1238)) as '1' (S7). Host H sends the corresponding TV program data record completed notice (S8) and Personal Computer PC sends the corresponding TV program data record completed notice (S9), both of which are received by Communication Device 200 (S10). CPU 211 of Communication Device 200 registers the corresponding record completed flag data (of Timer Recording TV Program Relating Data Storage Area 20652*b*7 (FIG. 1211)) as '1' (S11).

<<Keyword Search Timer Recording Function—Another Embodiment04>>

FIGS. 1242 through 1254 illustrate another embodiment of the present function wherein the timer record setting is performed by Communication Device 200, the timer recording is administered by Personal Computer PC, and the TV program data is stored in Personal Computer PC. Here, Personal Computer PC may be any type of personal computer including the ones described in this specification (excluding Host H (FIG. 429) and Communication Device 200).

FIG. 1242 illustrates the software programs stored in Keyword Search Timer Recording Software Storage Area H52*c* (FIG. 1200) of Host H (FIG. 429). As described in the present drawing, Keyword Search Timer Recording Software Storage Area H52*c* stores Keyword Search Timer Recording Data Sending Software H52*c*2 and Timer Recording Software H52*c*7. Keyword Search Timer Recording Data Sending Software H52*c*2 is the software program described in FIG. 1246. Timer Recording Software H52*c*7 is the software program described in FIG. 1253*a*.

FIG. 1243 illustrates the software programs stored in Keyword Search Timer Recording Software Storage Area 20652*c* (FIG. 1212) of Communication Device 200. As described in the present drawing, Keyword Search Timer Recording Software Storage Area 20652*c* stores Keyword Search Timer Recording Data Request Sending Software 20652*c*1, Keyword Search Timer Recording Data Receiving Software 20652*c*3, Timer Recording Setting By Actors/Actresses Software 20652*c*4, Timer Recording Setting By Category Software 20652*c*5, Re-run Avoiding Process Software 20652*c*6, Timer Recording TV Program Relating Data Sending/Receiving Software 20652*c*6*a*, Timer Recording Software 20652*c*7, and Timer Recording Notification Displaying Software 20652*c*8. Keyword Search Timer Recording Data Request Sending Software 20652*c*1 is the software program described in FIG. 1245. Keyword Search Timer Recording Data Receiving Software 20652*c*3 is the software program described in FIG. 1247. Timer Recording Setting By Actors/Actresses Software 20652*c*4 is the software program described in FIG. 1248. Timer Recording Setting By Category Software 20652*c*5 is the software program described in FIG. 1249. Re-run Avoiding Process Software 20652*c*6 is the software program described in FIGS. 1250 and 1251. Timer Recording TV Program Relating Data Sending/Receiving Software 20652*c*6*a* is the software program described in FIG. 1252. Timer Recording Software 20652*c*7 is the software program described in FIG. 1253*a*. Timer Recording Notification Displaying Software 20652*c*8 is the software program described in FIG. 1254.

FIG. 1244 illustrates the software programs stored in Keyword Search Timer Recording Software Storage Area PC52*c* (FIG. 1236) of Personal Computer PC (FIG. 1235). As described in the present drawing, Keyword Search Timer Recording Software Storage Area PC52*c* stores Timer Recording TV Program Relating Data Sending/Receiving Software PC52*c*6*a* and Timer Recording Software PC52*c*7. Timer Recording TV Program Relating Data Sending/Receiving Software PC52*c*6*a* is the software program described in FIG. 1252. Timer Recording Software PC52*c*7 is the software program described in FIG. 1253*a*.

FIG. 1245 illustrates Keyword Search Timer Recording Data Request Sending Software 20652*c*1 stored in Keyword Search Timer Recording Software Storage Area 20652*c* (FIG. 1243) of Communication Device 200, which sends the keyword search timer recording data request to Host H (FIG. 429). Referring to the present drawing, CPU 211 (FIG. 1) of Communication Device 200 sends the keyword search timer recording data request to Host H (S1). Here, the keyword search timer recording data request is a request signal which requests to send back the keyword search timer recording data stored in Keyword Search Timer Recording Data Storage Area H52*b* (FIG. 1191) of Host H.

FIG. 1246 illustrates Keyword Search Timer Recording Data Sending Software H52*c*2 stored in Keyword Search Timer Recording Software Storage Area H52*c* (FIG. 1242) of Host H (FIG. 429), which sends the keyword search timer recording data to Communication Device 200. Referring to the present drawing, Host H, upon receiving the keyword search timer recording data request from Communication Device 200 (S1), retrieves the keyword search timer recording data from Keyword Search Timer Recording Data Storage Area H52*b* (FIG. 1191), excluding the data stored in TV Program Data Storage Area H52*b*1 (FIG. 1192). The data stored in Timer Recording TV Program Relating Data Storage Area H52*b*7 (FIG. 1199) are also retrieved, however, only of the ones of the corresponding user ID.

FIG. 1247 illustrates Keyword Search Timer Recording Data Receiving Software 20652*c*3 stored in Keyword Search Timer Recording Software Storage Area 20652*c* (FIG. 1243)

of Communication Device 200, which receives and stores the keyword search timer recording data sent from Host H (FIG. 429). Referring to the present drawing, CPU 211 (FIG. 1) of Communication Device 200 receives the keyword search timer recording data from Host H (S1). CPU 211 then stores the data in Keyword Search Timer Recording Data Storage Area 20652*b* (FIG. 1203) (S2).

FIG. 1248 illustrates Timer Recording Setting By Actors/Actresses Software 20652*c*4 stored in Keyword Search Timer Recording Software Storage Area 20652*c* (FIG. 1243) of Communication Device 200, which sets the timer recording by inputting the names of actors and/or actresses. Referring to the present drawing, the actors/actresses' name input area in which the names of actors and/or actresses are to be input is displayed on LCD 201 (FIG. 1) (S1). The names of actors and/or actresses are input to the area by utilizing Input Device 210 (FIG. 1) or via voice recognition system (S2). CPU 211 searches TV Program Actors/Actresses Data Storage Area 20652*b*4 (FIG. 1208) (S3), and identifies the TV program IDs of the TV programs having the actors and/or actresses identified in S2 acting therein, as well as implementing the re-run avoiding process (S4). The re-run avoiding process is the process described in FIGS. 1250 and 1251. CPU 211 identifies the corresponding TV program channel data and the TV program time frame data #1 of each TV program ID by referring to TV Program Channel Data Storage Area 20652*b*3 (FIG. 1206) and TV Program Time Frame Data Storage Area 20652*b*2 (FIGS. 1204 and/or 1205), and stores the TV program IDs, the TV program channel data, and the TV program time frame data #1 (collectively referred to as the 'timer recording setting data' hereinafter) in Timer Recording TV Program Relating Data Storage Area 20652*b*7 (FIG. 1211) (S5). The timer recording setting data is displayed on LCD 201 (S6).

FIG. 1249 illustrates Timer Recording Setting By Category Software 20652*c*5 stored in Keyword Search Timer Recording Software Storage Area 20652*c* (FIG. 1243) of Communication Device 200, which sets the timer recording by inputting the names of the categories. Referring to the present drawing, the category input area in which the names of the categories are to be input is displayed on LCD 201 (FIG. 1) (S1). The names of the categories are input to the area by utilizing Input Device 210 (FIG. 1) or via voice recognition system (S2). CPU 211 searches TV Program Category Data Storage Area 20652*b*5 (FIG. 1209) (S3), and identifies the TV program IDs of the TV programs pertaining to the categories identified in S2, as well as implementing the re-run avoiding process (S4). The re-run avoiding process is the process described in FIGS. 1250 and 1251. CPU 211 identifies the corresponding TV program channel data and the TV program time frame data #1 of each TV program ID by referring to TV Program Channel Data Storage Area 20652*b*3 (FIG. 1206) and TV Program Time Frame Data Storage Area 20652*b*2 (FIGS. 1204 and/or 1205), and stores the TV program IDs, the TV program channel data, and the TV program time frame data #1 (i.e., timer recording setting data) in Timer Recording TV Program Relating Data Storage Area 20652*b*7 (FIG. 1211) (S5). The timer recording setting data is displayed on LCD 201 (S6).

FIG. 1250 illustrates Re-run Avoiding Process Software 20652*c*6 stored in Keyword Search Timer Recording Software Storage Area 20652*c* (FIG. 1243) of Communication Device 200, which avoids selecting the re-runs of the TV programs which are already selected. Referring to the present drawing, CPU 211 (FIG. 1) searches column 'TV Program Time Frame Data #1' of TV Program Time Frame Data Storage Area 20652*b*2 described in FIG. 1204 (S1). The re-runs are avoided from being selected by prohibiting to search column 'TV Program Time Frame Data #2'.

FIG. 1251 illustrates another embodiment of Re-run Avoiding Process Software 20652*c*6 stored in Keyword Search Timer Recording Software Storage Area 20652*c* (FIG. 1243) of Communication Device 200, which avoids selecting the re-runs of the TV programs which are already selected. Referring to the present drawing, CPU 211 (FIG. 1) of searches column 'Re-run Flag Data' of TV Program Time Frame Data Storage Area 20652*b*2 described in FIG. 1205 (S1). If the re-run flag data is '1' (S2), CPU 211 prohibits the corresponding TV program data to be timer recorded (S3). In the example described in FIG. 1205, the TV programs #1 and #5 of which the TV program time frame data #1 are '20:30-21:00' and '20:30-21:30' respectively, are re-runs (i.e., the re-run flag data are registered as '1'). Therefore, the TV program data of which the TV program IDs are TV programs #1 and #5 on-aired on 20:30-21:00 and 20:30-21:30 respectively are refrained from being timer recorded.

FIG. 1252 illustrates Timer Recording TV Program Relating Data Sending/Receiving Software 20652*c*6*a* stored in Keyword Search Timer Recording Software Storage Area 20652*c* (FIG. 1243) of Communication Device 200 and Timer Recording TV Program Relating Data Sending/Receiving Software PC52*c*6*a* stored in Keyword Search Timer Recording Software Storage Area PC52*c* (FIG. 1244) of Personal Computer PC (FIG. 1235), which sends and receives the timer recording TV program relating data. Referring to the present drawing, CPU 211 (FIG. 1) of Communication Device 200 retrieves the timer recording TV program relating data from Timer Recording TV Program Relating Data Storage Area 20652*b*7 (FIG. 1211) (S1). CPU 211 then sends the timer recording TV program relating data to Personal Computer PC (S2). Upon receiving the timer recording TV program relating data from Communication Device 200 (S3), Personal Computer PC stores the data in Timer Recording TV Program Relating Data Storage Area PC52*b*7 (S4).

FIGS. 1253*a* and 1253*b* illustrate Timer Recording Software H52*c*7 stored in Keyword Search Timer Recording Software Storage Area H52*c* (FIG. 1242) of Host H (FIG. 429), Timer Recording Software 20652*c*7 stored in Keyword Search Timer Recording Software Storage Area 20652*c* (FIG. 1243) of Communication Device 200, and Timer Recording Software PC52*c*7 of Personal Computer PC (FIG. 1235), which implement the timer recording in accordance to the settings described in FIGS. 1216 and/or 1217. Referring to the present drawing, Personal Computer PC retrieves the TV program time frame data from Timer Recording TV Program Relating Data Storage Area PC52*b*7 (FIG. 1238) (S1). If the time frame data matches with the current time (S2), Personal Computer PC sends the corresponding TV program data downloading request to Host H (S3). Upon receiving the corresponding TV program data downloading request from Personal Computer PC (S4), Host H retrieves the corresponding TV program data from TV Program Data Storage Area H52*b*1 (FIG. 1192) (S5), and sends the data to Personal Computer PC (S6). Personal Computer PC receives the corresponding TV program data from Host H (S7), and stores the corresponding TV program data in Timer Recording TV Program Relating Data Storage Area PC52*b*7 (FIG. 1238) (S8). Personal Computer PC then registers the corresponding record completed flag data (of Timer Recording TV Program Relating Data Storage Area PC52*b*7) as '1' (S9). Host H registers the corresponding record completed flag data (of Timer Recording TV Program Relating Data Storage Area H52*b*7 (FIG. 1199)) as '1' (S10). Personal Computer PC sends the corresponding record completed flag data (of Timer Recording TV Program Relating Data Storage Area PC52*b*7) (S11), which is received by Communication Device 200 (S12). Communication Device 200 registers the corresponding record completed flag data (of Timer Recording TV Program Relating Data Storage Area **20652*b*7 (FIG. 1211)) as '1' (S13**).

FIG. 1254 illustrates Timer Recording Notification Displaying Software **20652*c*8 stored in Keyword Search Timer Recording Software Storage Area 20652*c* (FIG. 1243) of Communication Device 200, which displays a notification on LCD 201 (FIG. 1) when a new TV program data is recorded. Referring to the present drawing, CPU 211 periodically checks the status of TV Timer Recording TV Program Relating Data Storage Area 20652*b*7 (FIG. 1211) (S1). If a new TV program data stored (S2), CPU 211 displays the timer recording notification on LCD 201 (FIG. 1) which indicates that a new TV program data is recorded (S3**).

For the avoidance of doubt, FIGS. 1221 through **1221*b*** are also applicable to this embodiment.

<<Keyword Search Timer Recording Function—Summary>>

(1) A communication device comprising a microphone, a speaker, a display, an input device and a multiple mode implementor, wherein said multiple mode implementor implements a voice communication mode and a timer recording mode, a series of audio data are input to and output from said microphone and said speaker respectively when said voice communication mode is implemented, a certain criteria is input via said input device, among a plurality of TV program data one or more of qualified TV program data which meet said criteria are recorded when said timer recording mode is implemented.

(2) A timer recording software program which is downloadable via network wherein a certain criteria is set, among a plurality of TV program data one or more of qualified TV program data which meet said criteria are recorded under the control of said timer recording software program.

(3) The re-runs of said qualified TV program data are prohibited from being recorded.

(4) Said qualified TV program data are recorded in said communication device.

(5) Said qualified TV program data are recorded in a host.

(6) Said qualified TV program data are recorded in a personal computer.

(7) The timer recording of said qualified TV program is implemented by said communication device.

(8) The timer recording of said qualified TV program is implemented by a host.

(9) The timer recording of said qualified TV program is implemented by a personal computer.

(10) The TV program data which pertain to a certain category are deemed as said qualified TV program data.

(11) The TV program data in which selected actors and/or actresses are acting are deemed as said qualified TV program data.

<<Weather Forecast Displaying Function>>

FIGS. 1255 through 1288 illustrate the weather forecast displaying function which displays on LCD 201 (FIG. 1) the weather forecast of the current location of Communication Device 200.

FIG. 1255 illustrates the storage area included in Host H (FIG. 429). As described in the present drawing, Host H includes Weather Forecast Displaying Information Storage Area H**53*a* of which the data and the software programs stored therein are described in FIG. 1256**.

FIG. 1256 illustrates the storage areas included in Weather Forecast Displaying Information Storage Area H**53*a* (FIG. 1255). As described in the present drawing, Weather Forecast Displaying Information Storage Area H53*a* includes Weather Forecast Displaying Data Storage Area H53*b* and Weather Forecast Displaying Software Storage Area H53*c*. Weather Forecast Displaying Data Storage Area H53*b* stores the data necessary to implement the present function on the side of Host H (FIG. 429), such as the ones described in FIGS. 1258 through 1261. Weather Forecast Displaying Software Storage Area H53*c* stores the software programs necessary to implement the present function on the side of Host H (FIG. 429), such as the ones described in FIG. 1262**.

FIG. 1257 illustrates the storage areas included in Weather Forecast Displaying Data Storage Area H**53*b* (FIG. 1256). As described in the present drawing, Weather Forecast Displaying Data Storage Area H53*b* includes Geographic Area Data Storage Area H53*b*1, Weather Forecast Data Storage Area H53*b*2, Location Name Data Storage Area H53*b*3, Calculated GPS Data Storage Area H53*b*4, and Work Area H53*b*5. Geographic Area Data Storage Area H53*b*1 stores the data described in FIG. 1258. Weather Forecast Data Storage Area H53*b*2 stores the data described in FIG. 1259. Location Name Data Storage Area H53*b*3 stores the data described in FIG. 1260. Calculated GPS Data Storage Area H53*b*4 stores the data described in FIG. 1261. Work Area H53*b*5 is utilized as a work area for Host H (FIG. 429**) to perform calculation and store data temporarily.

FIG. 1258 illustrates the data stored in Geographic Area Data Storage Area H**53*b*1 (FIG. 1257). As described in the present drawing, Geographic Area Data Storage Area H53*b*1 comprises two columns, i.e., 'Location ID' and 'Geographic Area Data'. Column 'Location ID' stores the location IDs, and each location ID is an identification of the corresponding geographic area data stored in column 'Geographic Area Data'. Column 'Geographic Area Data' stores the geographic area data, and each geographic area data represents the predetermined geographic area. In the example described in the present drawing, Geographic Area Data Storage Area H53*b*1 stores the following data: the location ID 'Location #1" and the geographic area data 'Geographic Area Data#1'; the location ID 'Location #2" and the geographic area data 'Geographic Area Data#2'; the location ID 'Location #3" and the geographic area data 'Geographic Area Data#3'; and the location ID 'Location #4" and the geographic area data 'Geographic Area Data#4'. Here, 'Geographic Area Data#1' represents the geographic area of Sacramento, Calif.; 'Geographic Area Data#2' represents the geographic area of San Jose, Calif.; 'Geographic Area Data#3' represents the geographic area of San Francisco, Calif.; and 'Geographic Area Data#4**' represents the geographic area of San Mateo, Calif.

FIG. 1259 illustrates the data stored in Weather Forecast Data Storage Area H**53*b*2 (FIG. 1257). As described in the present drawing, Weather Forecast Data Storage Area H53*b*2 comprises two columns, i.e., 'Location ID' and 'Weather Forecast Data'. Column 'Location ID' stores the location IDs described hereinbefore. Column 'Weather Forecast Data' stores the weather forecast data, and each weather forecast data represents the weather forecast of the geographic area data corresponding to the location ID stored in Geographic Area Data Storage Area H53*b*1 (FIG. 1258). In the example described in the present drawing, Weather Forecast Data Storage Area H53*b*2 stores the following data: the location ID 'Location #1' and the weather forecast data 'Sunny'; the location ID 'Location #2' and the weather forecast data 'Sunny'; the location ID 'Location #3' and the weather forecast data 'Cloudy'; and the location ID 'Location #4' and the weather forecast data 'Cloudy'. By referring to the data stored in Geographic Area Data Storage Area H53*b*1 (FIG. 1258), the following is implied: the weather forecast of Sacramento, Calif. (Geographic Area Data#1) is 'Sunny'; the weather forecast of San Jose, Calif. (Geographic Area Data#2) is 'Sunny'; the weather forecast of San Francisco, Calif. (Geographic Area Data#3) is 'Cloudy'; and the weather forecast of San Mateo, Calif. (Geographic Area Data#4**) is 'Cloudy'.

FIG. 1260 illustrates the data stored in Location Name Data Storage Area H53*b*3 (FIG. 1257). As described in the present drawing, Location Name Data Storage Area H53*b*3 comprises two columns, i.e., 'Location ID' and 'Location Name Data'. Column 'Location ID' stores the location IDs described hereinbefore. Column 'Location Name Data' stores the location name data, and each location data represents the name of the geographic area data stored in Geographic Area Data Storage Area H53*b*1 (FIG. 1258) of the corresponding location ID. In the example described in the present drawing, Location Name Data Storage Area H53*b*3 stores the following data: the location ID 'Location #1' and the location name data 'Sacramento, Calif.' corresponding to the geographic area data 'Geographic Area Data#1' stored in Geographic Area Data Storage Area H53*b*1; the location ID 'Location #2' and the location name data 'San Jose, Calif.' corresponding to the geographic area data 'Geographic Area Data#2' stored in Geographic Area Data Storage Area H53*b*1; the location ID 'Location #3' and the location name data 'San Francisco, Calif.' corresponding to the geographic area data 'Geographic Area Data#3' stored in Geographic Area Data Storage Area H53*b*1; and the location ID 'Location #4' and the location name data 'San Mateo, Calif.' corresponding to the geographic area data 'Geographic Area Data#4' stored in Geographic Area Data Storage Area H53*b*1.

FIG. 1261 illustrates the data stored in Calculated GPS Data Storage Area H53*b*4 (FIG. 1257). As described in the present drawing, Calculated GPS Data Storage Area H53*b*4 comprises two columns, i.e., 'User ID' and 'Calculated GPS Data'. Column 'User ID' stores the user IDs, and each user ID represents the identification of Communication Device 200. Column 'Calculated GPS Data' stores the calculated GPS data, and each calculated GPS data represents the current geographic location of Communication Device 200 of the corresponding user ID in (x, y, z) format. In the example described in the present drawing, Calculated GPS Data Storage Area H53*b*4 stores the following data: the user ID 'User #1' and the calculated GPS data 'x1, y1, z1' of the Communication Device 200 of the corresponding user ID; the user ID 'User #2' and the calculated GPS data 'x2, y2, z2' of the Communication Device 200 of the corresponding user ID; and the user ID 'User #3' and the calculated GPS data 'x3, y3, z3' of the Communication Device 200 of the corresponding user ID.

FIG. 1262 illustrates the software programs stored in Weather Forecast Displaying Software Storage Area H53*c* (FIG. 1256). As described in the present drawing, Weather Forecast Displaying Software Storage Area H53*c* stores Weather Forecast Data Updating Software H53*c*1, Weather Forecast Displaying Data Sending/Receiving Software H53*c*1*a*, and Com. Device Pin-pointing Software H53*c*2. Weather Forecast Data Updating Software H53*c*1 is the software program described in FIG. 1271. Weather Forecast Displaying Data Sending/Receiving Software H53*c*1*a* is the software program described in FIG. 1272. Com. Device Pin-pointing Software H53*c*2 is the software program described in FIG. 1273.

FIG. 1263 illustrates the storage area included in RAM 206 (FIG. 1) of Communication Device 200. As described in the present drawing, RAM 206 includes Weather Forecast Displaying Information Storage Area 20653*a* of which the data and the software programs stored therein are described in FIG. 1264.

FIG. 1264 illustrates the storage areas included in Weather Forecast Displaying Information Storage Area 20653*a* (FIG. 1263). As described in the present drawing, Weather Forecast Displaying Information Storage Area 20653*a* includes Weather Forecast Displaying Data Storage Area 20653*b* and Weather Forecast Displaying Software Storage Area 20653*c*. Weather Forecast Displaying Data Storage Area 20653*b* stores the data necessary to implement the present function on the side of Communication Device 200, such as the ones described in FIGS. 1266 through 1269. Weather Forecast Displaying Software Storage Area 20653*c* stores the software programs necessary to implement the present function on the side of Communication Device 200, such as the ones described in FIG. 1270.

The software programs stored in Weather Forecast Displaying Software Storage Area 20653*c* (FIG. 1264) are downloaded from Host H (FIG. 429) in the manner described in FIGS. 401 through 407.

FIG. 1265 illustrates the storage areas included in Weather Forecast Displaying Data Storage Area 20653*b* (FIG. 1264). As described in the present drawing, Weather Forecast Displaying Data Storage Area 20653*b* includes Geographic Area Data Storage Area 20653*b*1, Weather Forecast Data Storage Area 20653*b*2, Location Name Data Storage Area 20653*b*3, Calculated GPS Data Storage Area 20653*b*4, and Work Area 20653*b*5. Geographic Area Data Storage Area 20653*b*1 stores the data described in FIG. 1266. Weather Forecast Data Storage Area 20653*b*2 stores the data described in FIG. 1267. Location Name Data Storage Area 20653*b*3 stores the data described in FIG. 1268. Calculated GPS Data Storage Area 20653*b*4 stores the data described in FIG. 1269. Work Area 20653*b*5 is utilized as a work area for Communication Device 200 to perform calculation and store data temporarily.

FIG. 1266 illustrates the data stored in Geographic Area Data Storage Area 20653*b*1 (FIG. 1265). As described in the present drawing, Geographic Area Data Storage Area 20653*b*1 comprises two columns, i.e., 'Location ID' and 'Geographic Area Data'. Column 'Location ID' stores the location IDs, and each location ID is an identification of the corresponding geographic area data stored in column 'Geographic Area Data'. Column 'Geographic Area Data' stores the geographic area data, and each geographic area data represents the predetermined geographic area. In the example described in the present drawing, Geographic Area Data Storage Area 20653*b*1 stores the following data: the location ID 'Location #1' and the geographic area data 'Geographic Area Data#1'; the location ID 'Location #2' and the geographic area data 'Geographic Area Data#2'; the location ID 'Location #3' and the geographic area data 'Geographic Area Data#3'; and the location ID 'Location #4' and the geographic area data 'Geographic Area Data#4'. Here, 'Geographic Area Data#1' represents the geographic area of Sacramento, Calif.; 'Geographic Area Data#2' represents the geographic area of San Jose, Calif.; 'Geographic Area Data#3' represents the geographic area of San Francisco, Calif.; and 'Geographic Area Data#4' represents the geographic area of San Mateo, Calif.

FIG. 1267 illustrates the data stored in Weather Forecast Data Storage Area 20653*b*2 (FIG. 1265). As described in the present drawing, Weather Forecast Data Storage Area 20653*b*2 comprises two columns, i.e., 'Location ID' and 'Weather Forecast Data'. Column 'Location ID' stores the location IDs described hereinbefore. Column 'Weather Forecast Data' stores the weather forecast data, and each weather forecast data represents the weather forecast of the geographic area data corresponding to the location ID stored in Geographic Area Data Storage Area **20653*b*1 (FIG. 1266). In the example described in the present drawing, Weather Forecast Data Storage Area 20653*b*2 stores the following data: the location ID 'Location #1' and the weather forecast data 'Sunny'; the location ID 'Location #2' and the weather forecast data 'Sunny'; the location ID 'Location #3' and the weather forecast data 'Cloudy'; and the location ID 'Location #4' and the weather forecast data 'Cloudy'. By referring to the data stored in Geographic Area Data Storage Area 20653*b*1 (FIG. 1266), the following is implied: the weather forecast of Sacramento, Calif. (Geographic Area Data#1) is 'Sunny'; the weather forecast of San Jose, Calif. (Geographic Area Data#2) is 'Sunny'; the weather forecast of San Francisco, Calif. (Geographic Area Data#3) is 'Cloudy'; and the weather forecast of San Mateo, Calif. (Geographic Area Data#4**) is 'Cloudy'.

FIG. 1268 illustrates the data stored in Location Name Data Storage Area **20653*b*3 (FIG. 1265). As described in the present drawing, Location Name Data Storage Area 20653*b*3 comprises two columns, i.e., 'Location ID' and 'Location Name Data'. Column 'Location ID' stores the location IDs described hereinbefore. Column 'Location Name Data' stores the location name data, and each location data represents the name of the geographic area data stored in Geographic Area Data Storage Area 20653*b*1 (FIG. 1266) of the corresponding location ID. In the example described in the present drawing, Location Name Data Storage Area 20653*b*3 stores the following data: the location ID 'Location #1' and the location name data 'Sacramento, Calif.' corresponding to the geographic area data 'Geographic Area Data#1' stored in Geographic Area Data Storage Area 20653*b*1; the location ID 'Location #2' and the location name data 'San Jose, Calif.' corresponding to the geographic area data 'Geographic Area Data#2' stored in Geographic Area Data Storage Area 20653*b*1; the location ID 'Location #3' and the location name data 'San Francisco, Calif.' corresponding to the geographic area data 'Geographic Area Data#3' stored in Geographic Area Data Storage Area 20653*b*1; and the location ID 'Location #4' and the location name data 'San Mateo, Calif.' corresponding to the geographic area data 'Geographic Area Data#4' stored in Geographic Area Data Storage Area 20653*b*1**.

FIG. 1269 illustrates the data stored in Calculated GPS Data Storage Area **20653*b*4 (FIG. 1265). As described in the present drawing, Calculated GPS Data Storage Area 20653*b*4 comprises two columns, i.e., 'User ID' and 'Calculated GPS Data'. Column 'User ID' stores the user ID, which represents the identification of Communication Device 200. Column 'Calculated GPS Data' stores the calculated GPS data, which represents the current geographic location of Communication Device 200 of the corresponding user ID in (x, y, z) format. In the example described in the present drawing, Calculated GPS Data Storage Area 20653*b*4 stores the following data: the user ID 'User #1' and the calculated GPS data 'x1, y1, z1' of the Communication Device 200 of 'User #1**'.

FIG. 1270 illustrates the software programs stored in Weather Forecast Displaying Software Storage Area **20653*c* (FIG. 1264). As described in the present drawing, Weather Forecast Displaying Software Storage Area 20653*c* stores Weather Forecast Data Sending/Receiving Software 20653*c*1*a*, Com. Device Pin-pointing Software 20653*c*2, Geographic Area Data Identifying Software 20653*c*3, Weather Forecast Data Identifying Software 20653*c*4, Location Name Data Identifying Software 20653*c*5, and Current Location Weather Forecasting Data Displaying Software 20653*c*6. Weather Forecast Data Sending/Receiving Software 20653*c*1*a* is the software program described in FIG. 1272. Com. Device Pin-pointing Software 20653*c*2 is the software program described in FIGS. 1273 and 1274. Geographic Area Data Identifying Software 20653*c*3 is the software program described in FIG. 1275. Weather Forecast Data Identifying Software 20653*c*4 is the software program described in FIG. 1276. Location Name Data Identifying Software 20653*c*5 is the software program described in FIG. 1277. Current Location Weather Forecasting Data Displaying Software 20653*c*6 is the software program described in FIG. 1278**.

FIG. 1271 illustrates Weather Forecast Data Updating Software H**53*c*1 stored in Weather Forecast Displaying Software Storage Area H53*c* (FIG. 1262) of Host H (FIG. 429), which periodically updates the weather forecast data stored in Weather Forecast Data Storage Area H53*b*2 (FIG. 1259). Referring to the present drawing, Host H periodically checks for the updated weather forecast data (S1). If any updated weather forecast data is received from another host computer (S2), Host H updates Weather Forecast Data Storage Area H53*b*2 (FIG. 1259) accordingly (S3**).

FIG. 1272 illustrates Weather Forecast Displaying Data Sending/Receiving Software H**53*c*1*a* stored in Weather Forecast Displaying Software Storage Area H53*c* (FIG. 1262) of Host H (FIG. 429) and Weather Forecast Data Sending/Receiving Software 20653*c*1*a* stored in Weather Forecast Displaying Software Storage Area 20653*c* (FIG. 1270) of Communication Device 200, which sends and receives the weather forecast displaying data. Referring to the present drawing, CPU 211 (FIG. 1) of Communication Device 200 sends the weather forecast displaying data request to Host H (S1). Here, the weather forecast displaying data request is a request to send the weather forecast displaying data to Communication Device 200. Upon receiving the weather forecast displaying data request from Communication Device 200 (S2), Host H retrieves the weather forecast displaying data from Weather Forecast Displaying Data Storage Area H53*b* (FIG. 1257) (Host H) (S3), and sends the data to Communication Device 200 (S4). Upon receiving the weather forecast displaying data from Host H (S5), CPU 211 stores the weather forecast displaying data in Weather Forecast Displaying Data Storage Area 20653*b* (FIG. 1265) (S6**).

FIG. 1273 illustrates Com. Device Pin-pointing Software H**53*c*2 stored in Weather Forecast Displaying Software Storage Area H53*c* (FIG. 1262) of Host H (FIG. 429) and Com. Device Pin-pointing Software 20653*c*2 stored in Weather Forecast Displaying Software Storage Area 20653*c* (FIG. 1270) of Communication Device 200, which identifies the current geographic location of Communication Device 200. Referring to the present drawing, CPU 211 (FIG. 1) of Communication Device 200 collects the GPS raw data from the near base stations (S1). CPU 211 sends the raw GPS data to Host H (S2). Upon receiving the raw GPS data (S3), Host H produces the calculated GPS data by referring to the raw GPS data (S4). Host H stores the calculated GPS data in Calculated GPS Data Storage Area H53*b*4 (FIG. 1261) (S5). Host H then retrieves the calculated GPS data from Calculated GPS Data Storage Area H53*b*4 (FIG. 1261) (S6), and sends the data to Communication Device 200 (S7). Upon receiving the calculated GPS data from Host H (S8), CPU 211 stores the data in Calculated GPS Data Storage Area 20653*b*4 (FIG. 1269) (S9**). Here, the GPS raw data are the primitive data utilized to produce the calculated GPS data, and the calculated GPS data are the data representing the location in (x, y, z) format.

FIG. 1274 illustrates another embodiment of the sequence described in FIG. 1273 in which the entire process is performed solely by Com. Device Pin-pointing Software **20653*c*2 stored in Weather Forecast Displaying Software Storage Area 20653*c* (FIG. 1270) of Communication Device 200. Referring to the present drawing, CPU 211 (FIG. 1) of Communication Device 200 collects the raw GPS data from the near base stations (S1). CPU 211 then produces the calculated GPS data by referring to the raw GPS data (S2), and stores the calculated GPS data in Calculated GPS Data Storage Area 20653*b*4 (FIG. 1269) (S3**).

FIG. 1275 illustrates Geographic Area Data Identifying Software **20653*c*3 stored in Weather Forecast Displaying Software Storage Area 20653*c* (FIG. 1270) of Communication Device 200, which identifies the geographic area data to identify the geographic area in which Communication Device 200 is located. Referring to the present drawing, CPU 211 (FIG. 1) of Communication Device 200 retrieves the calculated GPS data from Calculated GPS Data Storage Area 20653*b*4 (FIG. 1269) (S1). CPU 211 then searches Geographic Area Data Storage Area 20653*b*1 (FIG. 1266) (S2) to identify the geographic area data in which the calculated GPS data is located (S3). CPU 211 stores the geographic area data identified in S3 in Work Area 20653*b*5 (FIG. 1265) (S4**).

FIG. 1276 illustrates Weather Forecast Data Identifying Software **20653*c*4 stored in Weather Forecast Displaying Software Storage Area 20653*c* (FIG. 1270) of Communication Device 200, which identifies the weather forecast data of the geographic area in which Communication Device 200 is located. Referring to the present drawing, CPU 211 (FIG. 1) of Communication Device 200 searches Weather Forecast Data Storage Area 20653*b*2 (FIG. 1267) for the location ID corresponding to the geographic area data identified in S3 of FIG. 1275 (S1). CPU 211 identifies the weather forecast data (S2), and stores the weather forecast data in Work Area 20653*b*5 (FIG. 1265) (S3**).

FIG. 1277 illustrates Location Name Data Identifying Software **20653*c*5 stored in Weather Forecast Displaying Software Storage Area 20653*c* (FIG. 1270) of Communication Device 200, which identifies the location name of the geographic area in which Communication Device 200 is located. Referring to the present drawing, CPU 211 (FIG. 1) of Communication Device 200 searches Location Name Data Storage Area 20653*b*3 (FIG. 1268) for the location ID corresponding to the geographic area data identified in S3 of FIG. 1275 (S1). CPU 211 identifies the location name data (S2), and stores the location name data in Work Area 20653*b*5 (FIG. 1265) (S3**).

FIG. 1278 illustrates Current Location Weather Forecasting Data Displaying Software **20653*c*6 stored in Weather Forecast Displaying Software Storage Area 20653*c* (FIG. 1270) of Communication Device 200, which displays the current location weather forecasting data. Referring to the present drawing, CPU 211 (FIG. 1) of Communication Device 200 retrieves the geographic area data from Work Area 20653*b*5 (FIG. 1265) (S1). CPU 211 then retrieves the weather forecast data from Work Area 20653*b*5 (FIG. 1265) (S2). CPU 211 further retrieves the location name data from Work Area 20653*b*5 (FIG. 1265) (S3). The data retrieved in S1 through S3 (collectively defined as the 'current location weather forecasting data') are displayed on LCD 201 (FIG. 1) (S4**).

<<Weather Forecast Displaying Function—Another Embodiment01>>

FIGS. 1279 through 1288 illustrate another embodiment of the present function wherein Host H (FIG. 429) implements the major task in performing the present function.

FIG. 1279 illustrates the software programs stored in Weather Forecast Displaying Software Storage Area H**53*c* (FIG. 1256). As described in the present drawing, Weather Forecast Displaying Software Storage Area H53*c* stores Weather Forecast Data Updating Software H53*c*1, Com. Device Pin-pointing Software H53*c*2, Geographic Area Data Identifying Software H53*c*3, Weather Forecast Data Identifying Software H53*c*4, Location Name Data Identifying Software H53*c*5, and Current Location Weather Forecasting Data Sending/Receiving Software H53*c*5*a*. Weather Forecast Data Updating Software H53*c*1 is the software program described in FIG. 1281. Com. Device Pin-pointing Software H53*c*2 is the software program described in FIG. 1282. Geographic Area Data Identifying Software H53*c*3 is the software program described in FIG. 1284. Weather Forecast Data Identifying Software H53*c*4 is the software program described in FIG. 1285. Location Name Data Identifying Software H53*c*5 is the software program described in FIG. 1286. Current Location Weather Forecasting Data Sending/Receiving Software H53*c*5*a* is the software program described in FIG. 1287**.

FIG. 1280 illustrates the software programs stored in Weather Forecast Displaying Software Storage Area **20653*c* (FIG. 1264). As described in the present drawing, Weather Forecast Displaying Software Storage Area 20653*c* stores Com. Device Pin-pointing Software 20653*c*2, Geographic Area Data Identifying Software 20653*c*3, Weather Forecast Data Identifying Software 20653*c*4, Location Name Data Identifying Software 20653*c*5, Current Location Weather Forecasting Data Sending/Receiving Software 20653*c*5*a*, and Current Location Weather Forecasting Data Displaying Software 20653*c*6. Com. Device Pin-pointing Software 20653*c*2 is the software program described in FIGS. 1282 and 1283. Geographic Area Data Identifying Software 20653*c*3 is the software program described in FIG. 1284. Weather Forecast Data Identifying Software 20653*c*4 is the software program described in FIG. 1285. Location Name Data Identifying Software 20653*c*5 is the software program described in FIG. 1286. Current Location Weather Forecasting Data Sending/Receiving Software 20653*c*5*a* is the software program described in FIG. 1287. Current Location Weather Forecasting Data Displaying Software 20653*c*6 is the software program described in FIG. 1288**.

FIG. 1281 illustrates Weather Forecast Data Updating Software H**53*c*1 stored in Weather Forecast Displaying Software Storage Area H53*c* (FIG. 1279) of Host H (FIG. 429), which periodically updates the weather forecast data stored in Weather Forecast Data Storage Area H53*b*2 (FIG. 1259). Referring to the present drawing, Host H periodically checks for the updated weather forecast data (S1). If any updated weather forecast data is received from another host computer (S2), Host H updates Weather Forecast Data Storage Area H53*b*2 (FIG. 1259) accordingly (S3**).

FIG. 1282 illustrates Com. Device Pin-pointing Software H**53*c*2 stored in Weather Forecast Displaying Software Storage Area H53*c* (FIG. 1279) of Host H (FIG. 429) and Com. Device Pin-pointing Software 20653*c*2 stored in Weather Forecast Displaying Software Storage Area 20653*c* (FIG. 1280) of Communication Device 200, which identifies the current geographic location of Communication Device 200. Referring to the present drawing, CPU 211 (FIG. 1) of Communication Device 200 collects the GPS raw data from the near base stations (S1). CPU 211 sends the raw GPS data to Host H (S2). Upon receiving the raw GPS data (S3), Host H produces the calculated GPS data by referring to the raw GPS data (S4). Host H stores the calculated GPS data in Calculated GPS Data Storage Area H53*b*4 (FIG. 1261) (S5). Host H then retrieves the calculated GPS data from Calculated GPS Data Storage Area H53*b*4 (FIG. 1261) (S6), and sends the data to Communication Device 200 (S7). Upon receiving the calculated GPS data from Host H (S8), CPU 211 stores the data in Calculated GPS Data Storage Area 20653*b*4 (FIG. 1269) (S9**). Here, the GPS raw data are the primitive data utilized to produce the calculated GPS data, and the calculated GPS data are the data representing the location in (x, y, z) format.

FIG. 1283 illustrates another embodiment of the sequence described in FIG. 1282 in which the entire process is performed solely by Com. Device Pin-pointing Software **20653*c*2 stored in Weather Forecast Displaying Software Storage Area 20653*c* (FIG. 1280) of Communication Device 200. Referring to the present drawing, CPU 211 (FIG. 1) of Communication Device 200 collects the raw GPS data from the near base stations (S1). CPU 211 then produces the calculated GPS data by referring to the raw GPS data (S2), and stores the calculated GPS data in Calculated GPS Data Storage Area 20653*b*4 (FIG. 1269) (S3**).

FIG. 1284 illustrates Geographic Area Data Identifying Software H**53*c*3 stored in Weather Forecast Displaying Software Storage Area H53*c* (FIG. 1279) of Host H (FIG. 429) and Geographic Area Data Identifying Software 20653*c*3 stored in Weather Forecast Displaying Software Storage Area 20653*c* (FIG. 1280) of Communication Device 200, which identifies the geographic area data to identify the geographic area in which Communication Device 200 is located. Referring to the present drawing, CPU 211 (FIG. 1) of Communication Device 200 sends a geographic area data request to Host H (S1). Here, the geographic area data request is a request to send the geographic area data to Communication Device 200. Upon receiving the geographic area data request from Communication Device 200 (S2), Host H retrieves the calculated GPS data from Calculated GPS Data Storage Area H53*b*4 (FIG. 1261) (S3), and searches Geographic Area Data Storage Area H53*b*1 (FIG. 1258) to identify the geographic area data in which the calculated GPS data is located (S4). Host H identifies the geographic area data (S5), and stores the data in Work Area H53*b*5 (FIG. 1257) (S6**).

FIG. 1285 illustrates Weather Forecast Data Identifying Software H**53*c*4 stored in Weather Forecast Displaying Software Storage Area H53*c* (FIG. 1279) of Host H (FIG. 429) and Weather Forecast Data Identifying Software 20653*c*4 stored in Weather Forecast Displaying Software Storage Area 20653*c* (FIG. 1280) of Communication Device 200, which identifies the weather forecast data of the geographic area in which Communication Device 200 is located. Referring to the present drawing, CPU 211 (FIG. 1) of Communication Device 200 sends a weather forecast data request to Host H (S1). Here, the weather forecast data request is a request to send the weather forecast data to Communication Device 200. Upon receiving the weather forecast data request from Communication Device 200 (S2), Host H searches Weather Forecast Data Storage Area H53*b*2 (FIG. 1259) for the location ID corresponding to the geographic area data identified in S5 of FIG. 1284 (S3). Host H identifies the weather forecast data corresponding to the location ID (S4). Host H then stores the weather forecast data in Work Area H53*b*5 (FIG. 1257) (S5**).

FIG. 1286 illustrates Location Name Data Identifying Software H**53*c*5 stored in Weather Forecast Displaying Software Storage Area H53*c* (FIG. 1279) of Host H (FIG. 429) and Location Name Data Identifying Software 20653*c*5 stored in Weather Forecast Displaying Software Storage Area 20653*c* (FIG. 1280) of Communication Device 200, which identifies the location name of the geographic area in which Communication Device 200 is located. Referring to the present drawing, CPU 211 (FIG. 1) of Communication Device 200 sends a location name data request to Host H (S1). Here, the location name data request is a request to send the location name data to Communication Device 200. Upon receiving the location name data request from Communication Device 200 (S2), Host H searches Location Name Data Storage Area H53*b*3 (FIG. 1260) for the location ID corresponding to the geographic area data identified in S5 of FIG. 1284 (S3). Host H identifies the location name data corresponding to the location ID (S4). Host H then stores the location name data in Work Area H53*b*5 (FIG. 1257) (S5**).

FIG. 1287 illustrates Current Location Weather Forecasting Data Sending/Receiving Software H**53*c*5*a* stored in Weather Forecast Displaying Software Storage Area H53*c* (FIG. 1279) of Host H (FIG. 429) and Current Location Weather Forecasting Data Sending/Receiving Software 20653*c*5*a* stored in Weather Forecast Displaying Software Storage Area 20653*c* (FIG. 1280) of Communication Device 200, which sends and receives the current location weather forecasting data. Referring to the present drawing, Host H retrieves the geographic area data from Work Area H53*b*5 (FIG. 1257) (S1). Host H retrieves the weather forecast data from Work Area H53*b*5 (FIG. 1257) (S2). Host H then retrieves the location name data from Work Area H53*b*5 (FIG. 1257) (S3). Host H sends the data retrieved in S1 through S3 (collectively defined as the 'current location weather forecasting data') to Communication Device 200 (S4). Upon receiving the data sent in S4 (S5), Communication Device 200 stores the data in Work Area 20653*b*5 (FIG. 1265) (S6**).

FIG. 1288 illustrates Current Location Weather Forecasting Data Displaying Software **20653*c*6 stored in Weather Forecast Displaying Software Storage Area 20653*c* (FIG. 1280) of Communication Device 200, which displays the current location weather forecasting data on LCD 201 (FIG. 1). Referring to the present drawing, CPU 211 (FIG. 1) of Communication Device 200 retrieves the geographic area data from Work Area 20653*b*5 (FIG. 1265) (S1). CPU 211 then retrieves the weather forecast data from Work Area 20653*b*5 (FIG. 1265) (S2). CPU 211 further retrieves the location name data from Work Area 20653*b*5 (FIG. 1265) (S3). The data retrieved in S1 through S3 are displayed on LCD 201 (FIG. 1) (S4**).

<<Weather Forecast Displaying Function—Summary>>

(1) A communication device comprising a microphone, a speaker, a display, an input device and a multiple mode implementor, wherein said multiple mode implementor implements a voice communication mode and a weather forecast displaying mode, a series of audio data are input to and output from said microphone and said speaker respectively when said voice communication mode is implemented, the weather forecast of the current location of said communication device is displayed on said display when said weather forecast displaying mode is implemented.

(2) A weather forecast displaying software program wherein the current location of a communication device is identified and the weather forecast of said current location is displayed on a display of said communication device.

<<Multiple Language Displaying Function>>

FIGS. 1289 through 1331 illustrate the multiple language displaying function wherein a language is selected from a plurality of languages, such as English, Japanese, French, and German, which is utilized to operate Communication Device 200.

FIG. 1289 illustrates the storage area included in RAM 206 (FIG. 1). As described in the present drawing, RAM 206 includes Multiple Language Displaying Info Storage Area **20654*a* of which the data and the software programs stored therein are described in FIG. 1290**.

The data and software programs stored in Multiple Language Displaying Info Storage Area 20654*a* (FIG. 1289) are downloaded from Host H (FIG. 429) in the manner described in FIGS. 401 through 407.

FIG. 1290 illustrates the storage areas included in Multiple Language Displaying Info Storage Area 20654*a* (FIG. 1289). As described in the present drawing, Multiple Language Displaying Info Storage Area 20654*a* includes Multiple Language Displaying Data Storage Area 20654*b* and Multiple Language Displaying Software Storage Area 20654*c*. Multiple Language Displaying Data Storage Area 20654*b* stores the data necessary to implement the present function, such as the ones described in FIGS. 1291 through 1298. Multiple Language Displaying Software Storage Area 20654*c* stores the software programs necessary to implement the present function, such as the ones described in FIG. 1299.

FIG. 1291 illustrates the storage areas included in Multiple Language Displaying Data Storage Area 20654*b* (FIG. 1290). As described in the present drawing, Multiple Language Displaying Data Storage Area 20654*b* includes Language Tables Storage Area 20654*b*1, Language Type Data Storage Area 20654*b*2, Language Item Data Storage Area 20654*b*3, and Selected Language Table ID Storage Area 20654*b*4. Language Tables Storage Area 20654*b*1 stores the data described in FIG. 1292. Language Type Data Storage Area 20654*b*2 stores the data described in FIG. 1297. Language Item Data Storage Area 20654*b*3 stores the data described in FIG. 1298. Selected Language Table ID Storage Area 20654*b*4 stores the language table ID selected in S4*s* of FIGS. 1300, 1308, 1316, and 1324.

FIG. 1292 illustrates the storage areas included in Language Tables Storage Area 20654*b*1 (FIG. 1291). As described in the present drawing, Language Tables Storage Area 20654*b*1 includes Language Table#1 Storage Area 20654*b*1*a*, Language Table#2 Storage Area 20654*b*1*b*, Language Table#3 Storage Area 20654*b*1*c*, and Language Table#4 Storage Area 20654*b*1*d*. Language Table#1 Storage Area 20654*b*1*a* stores the data described in FIG. 1293. Language Table#2 Storage Area 20654*b*1*b* stores the data described in FIG. 1294. Language Table#3 Storage Area 20654*b*1*c* stores the data described in FIG. 1295. Language Table#4 Storage Area 20654*b*1*d* stores the data described in FIG. 1296.

FIG. 1293 illustrates the data stored in Language Table#1 Storage Area 20654*b*1*a* (FIG. 1292). As described in the present drawing, Language Table#1 Storage Area 20654*b*1*a* comprises two columns, i.e., 'Language Item ID' and 'Language Text Data'. Column 'Language Item ID' stores the language item IDs, and each language item ID represents the identification of the corresponding language text data.

Column 'Language Text Data' stores the language text data, and each language text data represents the English text data displayed on LCD 201 (FIG. 1). In the example described in the present drawing, Language Table#1 Storage Area 20654*b*1*a* stores the following data: the language item ID 'Language Item#1' and the corresponding language text data 'Open file'; the language item ID 'Language Item#2' and the corresponding language text data 'Close file'; the language item ID 'Language Item#3' and the corresponding language text data 'Delete'; the language item ID 'Language Item#4' and the corresponding language text data 'Copy'; the language item ID 'Language Item#5' and the corresponding language text data 'Cut'; the language item ID 'Language Item#6' and the corresponding language text data 'Paste'; the language item ID 'Language Item#7' and the corresponding language text data 'Insert'; the language item ID 'Language Item#8' and the corresponding language text data 'File'; the language item ID 'Language Item#9' and the corresponding language text data 'Edit'; the language item ID 'Language Item#10' and the corresponding language text data 'View'; the language item ID 'Language Item#11' and the corresponding language text data 'Format'; the language item ID 'Language Item#12' and the corresponding language text data 'Tools'; the language item ID 'Language Item#13' and the corresponding language text data 'Window'; the language item ID 'Language Item#14' and the corresponding language text data 'Help'; the language item ID 'Language Item#15' and the corresponding language text data 'My Network'; the language item ID 'Language Item#16' and the corresponding language text data 'Trash'; the language item ID 'Language Item#17' and the corresponding language text data 'Local Disk'; the language item ID 'Language Item#18' and the corresponding language text data 'Save'; the language item ID 'Language Item#19' and the corresponding language text data 'Yes'; the language item ID 'Language Item#20' and the corresponding language text data 'No'; and the language item ID 'Language Item#21' and the corresponding language text data 'Cancel'.

FIG. 1294 illustrates the data stored in Language Table#1 Storage Area 20654*b*1*b* (FIG. 1292). As described in the present drawing, Language Table#1 Storage Area 20654*b*1*b* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the Japanese text data displayed on LCD 201 (FIG. 1). In the example described in the present drawing, Language Table#1 Storage Area 20654*b*1*b* stores the following data: the language item ID 'Language Item#1' and the corresponding language text data meaning 'Open file' in Japanese; the language item ID 'Language Item#2' and the corresponding language text data meaning 'Close file' in Japanese; the language item ID 'Language Item#3' and the corresponding language text data meaning 'Delete' in Japanese; the language item ID 'Language Item#4' and the corresponding language text data meaning 'Copy' in Japanese; the language item ID 'Language Item#5' and the corresponding language text data meaning 'Cut' in Japanese; the language item ID 'Language Item#6' and the corresponding language text data meaning 'Paste' in Japanese; the language item ID 'Language Item#7' and the corresponding language text data meaning 'Insert' in Japanese; the language item ID 'Language Item#8' and the corresponding language text data meaning 'File' in Japanese; the language item ID 'Language Item#9' and the corresponding language text data meaning 'Edit' in Japanese; the language item ID 'Language Item#10' and the corresponding language text data meaning 'View' in Japanese; the language item ID 'Language Item#11' and the corresponding language text data meaning 'Format' in Japanese; the language item ID 'Language Item#12' and the corresponding language text data meaning 'Tools' in Japanese; the language item ID 'Language Item#13' and the corresponding language text data meaning 'Window' in Japanese; the language item ID 'Language Item#14' and the corresponding language text data meaning 'Help' in Japanese; the language item ID 'Language Item#15' and the corresponding language text data meaning 'My Network' in Japanese; the language item ID 'Language Item#16' and the corresponding language text data meaning 'Trash' in Japanese; the language item ID 'Language Item#17' and the corresponding language text data meaning 'Local Disk' in Japanese; the language item ID 'Language Item#18' and the corresponding language text data meaning 'Save' in Japanese; the language item ID 'Language Item#19' and the corresponding language text data meaning 'Yes' in Japanese; the language item ID 'Language Item#20' and the corresponding language text data meaning 'No' in Japanese; and the language item ID 'Language Item#21' and the corresponding language text data meaning 'Cancel' in Japanese.

FIG. 1295 illustrates the data stored in Language Table#1 Storage Area 20654*b*1*c* (FIG. 1292). As described in the present drawing, Language Table#1 Storage Area 20654*b*1*c* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the French text data displayed on LCD 201 (FIG. 1). In the example described in the present drawing, Language Table#1 Storage Area 20654*b*1*c* stores the following data: the language item ID 'Language Item#1' and the corresponding language text data 'French#1' meaning 'Open file' in French; the language item ID 'Language Item#2' and the corresponding language text data 'French#2' meaning 'Close file' in French; the language item ID 'Language Item#3' and the corresponding language text data 'French#3' meaning 'Delete' in French; the language item ID 'Language Item#4' and the corresponding language text data 'French#4' meaning 'Copy' in French; the language item ID 'Language Item#5' and the corresponding language text data 'French#5' meaning 'Cut' in French; the language item ID 'Language Item#6' and the corresponding language text data 'French#6' meaning 'Paste' in French; the language item ID 'Language Item#7' and the corresponding language text data 'French#7' meaning 'Insert' in French; the language item ID 'Language Item#8' and the corresponding language text data 'French#8' meaning 'File' in French; the language item ID 'Language Item#9' and the corresponding language text data 'French#9' meaning 'Edit' in French; the language item ID 'Language Item#10' and the corresponding language text data 'French#10' meaning 'View' in French; the language item ID 'Language Item#11' and the corresponding language text data 'French#11' meaning 'Format' in French; the language item ID 'Language Item#12' and the corresponding language text data 'French#12' meaning 'Tools' in French; the language item ID 'Language Item#13' and the corresponding language text data 'French#13' meaning 'Window' in French; the language item ID 'Language Item#14' and the corresponding language text data 'French#14' meaning 'Help' in French; the language item ID 'Language Item#15' and the corresponding language text data 'French#15' meaning 'My Network' in French; the language item ID 'Language Item#16' and the corresponding language text data 'French#16' meaning 'Trash' in French; the language item ID 'Language Item#17' and the corresponding language text data 'French#17' meaning 'Local Disk' in French; the language item ID 'Language Item#18' and the corresponding language text data 'French#18' meaning 'Save' in French; the language item ID 'Language Item#19' and the corresponding language text data 'French#19' meaning 'Yes' in French; the language item ID 'Language Item#20' and the corresponding language text data 'French#20' meaning 'No' in French; and the language item ID 'Language Item#21' and the corresponding language text data 'French#21' meaning 'Cancel' in French.

FIG. 1296 illustrates the data stored in Language Table#1 Storage Area 20654*b*1*d* (FIG. 1292). As described in the present drawing, Language Table#1 Storage Area 20654*b*1*d* comprises two columns, i.e., 'Language Item ID' and 'Language Text Data'. Column 'Language Item ID' stores the language item IDs, and each language item ID represents the identification of the corresponding language text data. Column 'Language Text Data' stores the language text data, and each language text data represents the German text data displayed on LCD 201 (FIG. 1). In the example described in the present drawing, Language Table#1 Storage Area 20654*b*1*d* stores the following data: the language item ID 'Language Item#1' and the corresponding language text data 'German#1' meaning 'Open file' in German; the language item ID 'Language Item#2' and the corresponding language text data 'German#2' meaning 'Close file' in German; the language item ID 'Language Item#3' and the corresponding language text data 'German#3' meaning 'Delete' in German; the language item ID 'Language Item#4' and the corresponding language text data 'German#4' meaning 'Copy' in German; the language item ID 'Language Item#5' and the corresponding language text data 'German#5' meaning 'Cut' in German; the language item ID 'Language Item#6' and the corresponding language text data 'German#6' meaning 'Paste' in German; the language item ID 'Language Item#7' and the corresponding language text data 'German#7' meaning 'Insert' in German; the language item ID 'Language Item#8' and the corresponding language text data 'German#8' meaning 'File' in German; the language item ID 'Language Item#9' and the corresponding language text data 'German#9' meaning 'Edit' in German; the language item ID 'Language Item#10' and the corresponding language text data 'German#10' meaning 'View' in German; the language item ID 'Language Item#11' and the corresponding language text data 'German#11' meaning 'Format' in German; the language item ID 'Language Item#12' and the corresponding language text data 'German#12' meaning 'Tools' in German; the language item ID 'Language Item#13' and the corresponding language text data 'German#13' meaning 'Window' in German; the language item ID 'Language Item#14' and the corresponding language text data 'German#14' meaning 'Help' in German; the language item ID 'Language Item#15' and the corresponding language text data 'German#15' meaning 'My Network' in German; the language item ID 'Language Item#16' and the corresponding language text data 'German#16' meaning 'Trash' in German; the language item ID 'Language Item#17' and the corresponding language text data 'German#17' meaning 'Local Disk' in German; the language item ID 'Language Item#18' and the corresponding language text data 'German#18' meaning 'Save' in German; the language item ID 'Language Item#19' and the corresponding language text data 'German#19' meaning 'Yes' in German; the language item ID 'Language Item#20' and the corresponding language text data 'German#20' meaning 'No' in German; and the language item ID 'Language Item#21' and the corresponding language text data 'German#21' meaning 'Cancel' in German.

FIG. 1297 illustrates data stored in Language Type Data Storage Area 20654*b*2 (FIG. 1291). As described in the present drawing, Language Type Data Storage Area 20654*b*2 comprises two columns, i.e., 'Language Table ID' and 'Language Type Data'. Column 'Language Table ID' stores the language table ID, and each language table ID represents the identification of the storage areas included in Language Tables Storage Area 20654*b*1 (FIG. 1292). Column 'Language Type Data' stores the language type data, and each language type data represents the type of the language utilized in the language table of the corresponding language table ID. In the example described in the present drawing, Language Type Data Storage Area 20654*b*2 stores the following data: the language table ID 'Language Table#1' and the corresponding language type data 'English'; the language table ID 'Language Table#2' and the corresponding language type data 'Japanese'; the language table ID 'Language Table#3' and the corresponding language type data 'French'; and the language table ID 'Language Table#4' and the corresponding language type data 'German'. Here, the language table ID 'Language Table#1' is an identification of Language Table#1 Storage Area 20654*b*1*a* (FIG. 1293); the language table ID 'Language Table#2' is an identification of Language Table#2 Storage Area 20654*b*1*b* (FIG. 1294); the language table ID 'Language Table#3' is an identification of Language Table#3 Storage Area 20654*b*1*c* (FIG. 1295); and the language table ID 'Language Table#4' is an identification of Language Table#4 Storage Area 20654*b*1*d* (FIG. 1296).

FIG. 1298 illustrates the data stored in Language Item Data Storage Area 20654*b*3 (FIG. 1291). As described in the present drawing, Language Item Data Storage Area 20654*b*3 comprises two columns, i.e., 'Language Item ID' and 'Language Item Data'. Column 'Language Item ID' stores the language item IDs, and each language item ID represents the identification of the corresponding language item data. Column 'Language Item Data' stores the language item data, and each language item data represents the content and/or the meaning of the language text data displayed on LCD 201 (FIG. 1). In the example described in the present drawing, Language Item Data Storage Area 20654*b*3 stores the following data: the language item ID 'Language Item#1' and the corresponding language item data 'Open file'; the language item ID 'Language Item#2' and the corresponding language item data 'Close file'; the language item ID 'Language Item#3' and the corresponding language item data 'Delete'; the language item ID 'Language Item#4' and the corresponding language item data 'Copy'; the language item ID 'Language Item#5' and the corresponding language item data 'Cut'; the language item ID 'Language Item#6' and the corresponding language item data 'Paste'; the language item ID 'Language Item#7' and the corresponding language item data 'Insert'; the language item ID 'Language Item#8' and the corresponding language item data 'File'; the language item ID 'Language Item#9' and the corresponding language item data 'Edit'; the language item ID 'Language Item#10' and the corresponding language item data 'View'; the language item ID 'Language Item#11' and the corresponding language item data 'Format'; the language item ID 'Language Item#12' and the corresponding language item data 'Tools'; the language item ID 'Language Item#13' and the corresponding language item data 'Window'; the language item ID 'Language Item#14' and the corresponding language item data 'Help'; the language item ID 'Language Item#15' and the corresponding language item data 'My Network'; the language item ID 'Language Item#16' and the corresponding language item data 'Trash'; the language item ID 'Language Item#17' and the corresponding language item data 'Local Disk'; the language item ID 'Language Item#18' and the corresponding language item data 'Save'; the language item ID 'Language Item#19' and the corresponding language item data 'Yes'; the language item ID 'Language Item#20' and the corresponding language item data 'No'; and the language item ID 'Language Item#21' and the corresponding language item data 'Cancel'. Primarily, the data stored in column 'Language Item Data' are same as the ones stored in column 'Language Text Data' of Language Table#1 Storage Area 20654*b*1*a* (FIG. 1293).

FIG. 1299 illustrates the software program stored in Multiple Language Displaying Software Storage Area 20654*c* (FIG. 1290). As described in the present drawing, Multiple Language Displaying Software Storage Area 20654*c* stores Language Selecting Software 20654*c*1, Selected Language Displaying Software 20654*c*2, Language Text Data Displaying Software For Word Processor 20654*c*3*a*, Language Text Data Displaying Software For Word Processor 20654*c*3*b*, and Language Text Data Displaying Software For Explorer 20654*c*4. Language Selecting Software 20654*c*1 is the software program described in FIGS. 1300, 1308, 1316, and 1324. Selected Language Displaying Software 20654*c*2 is the software program described in FIGS. 1301, 1309, 1317, and 1325. Language Text Data Displaying Software For Word Processor 20654*c*3*a* is the software program described in FIGS. 1302, 1310, 1318, and 1326. Language Text Data Displaying Software For Word Processor 20654*c*3*b* is the software program described in FIGS. 1304, 1312, 1320, and 1328. Language Text Data Displaying Software For Explorer 20654*c*4 is the software program described in FIGS. 1306, 1314, 1322, and 1330.

<<Multiple Language Displaying Function—Utilizing English>>

FIG. 1300 illustrates Language Selecting Software 20654*c*1 stored in Multiple Language Displaying Software Storage Area 20654*c* (FIG. 1299) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 1297) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'English' is selected in S3. CPU 211 then identifies the language table ID corresponding to the language type data in Language Type Data Storage Area 20654*b*2 (FIG. 1297), and stores the language table ID (Language Table#1) in Selected Language Table ID Storage Area 20654*b*4 (FIG. 1291) (S4).

FIG. 1301 illustrates Selected Language Displaying Software 20654*c*2 stored in Multiple Language Displaying Software Storage Area 20654*c* (FIG. 1299) which displays and operates with the language selected in S3 of FIG. 1300 (i.e., English). Referring to the present drawing, when Communication Device 200 is powered on (S1), CPU 211 (FIG. 1) of Communication Device 200 retrieves the selected language table ID (Language Table#1) from Selected Language Table ID Storage Area 20654*b*4 (FIG. 1291) (S2). CPU 211 then identifies the storage area corresponding to the language table ID selected in S2 (Language Table#1 Storage Area 20654*b*1*a* (FIG. 1293)) in Language Tables Storage Area 20654*b*1 (FIG. 1292) (S3). Language text data displaying process is initiated thereafter of which the details are described hereinafter (S4).

FIG. 1302 illustrates Language Text Data Displaying Software For Word Processor 20654*c*3*a* stored in Multiple Language Displaying Software Storage Area 20654*c* (FIG. 1299) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#1 Storage Area 20654*b*1*a* (FIG. 1293) and displays the corresponding language text data 'File' at the predetermined location in the word processor (S2). CPU 211 identifies the language item ID 'Language Item#9' in Language Table#1 Storage Area 20654*b*1*a* (FIG. 1293) and displays the corresponding language text data 'Edit' at the predetermined location in the word processor (S3). CPU 211 identifies the language item ID 'Language Item#10' in Language Table#1 Storage Area 20654*b*1*a* (FIG. 1293) and displays the corresponding language text data 'View' at the predetermined location in the word processor (S4). CPU 211 identifies the language item ID 'Language Item#11' in Language Table#1 Storage Area 20654*b*1*a* (FIG. 1293) and displays the corresponding language text data 'Format' at the predetermined location in the word processor (S5). CPU 211 identifies the language item ID 'Language Item#12' in Language Table#1 Storage Area 20654*b*1*a* (FIG. 1293) and displays the corresponding language text data 'Tools' at the predetermined location in the word processor (S6). CPU 211 identifies the language item ID 'Language Item#13' in Language Table#1 Storage Area 20654*b*1*a* (FIG. 1293) and displays the corresponding language text data 'Window' at the predetermined location in the word processor (S7). CPU 211 identifies the language item ID 'Language Item#14' in Language Table#1 Storage Area 20654*b*1*a* (FIG. 1293) and displays the corresponding language text data 'Help' at the predetermined location in the word processor (S8). Alphanumeric data is input to the word processor by utilizing Input Device 210 (FIG. 1) or via voice recognition system thereafter (S9).

FIG. 1303 illustrates the data displayed on LCD 201 (FIG. 1) of Communication Device 200 at the time Language Text Data Displaying Software For Word Processor 20654*c*3*a* (FIG. 1302) is implemented. As described in the present drawing, the word processor described in FIG. 1302 is primarily composed of Menu Bar 20154MB and Alphanumeric Data Input Area 20154ADIA wherein the language text data described in S2 through S8 of FIG. 1302 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 1304 illustrates Language Text Data Displaying Software For Word Processor 20654*c*3*b* stored in Multiple Language Displaying Software Storage Area 20654*c* (FIG. 1299) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#1 Storage Area 20654*b*1*a* (FIG. 1293) and displays the corresponding language text data 'Save' at the predetermined location in the word processor (S2). CPU 211 identifies the language item ID 'Language Item#19' in Language Table#1 Storage Area 20654*b*1*a* (FIG. 1293) and displays the corresponding language text data 'Yes' at the predetermined location in the word processor (S3). CPU 211 identifies the language item ID 'Language Item#20' in Language Table#1 Storage Area 20654*b*1*a* (FIG. 1293) and displays the corresponding language text data 'No' at the predetermined location in the word processor (S4). CPU 211 identifies the language item ID 'Language Item#21' in Language Table#1 Storage Area 20654*b*1*a* (FIG. 1293) and displays the corresponding language text data 'Cancel' at the predetermined location in the word processor (S5). The save signal indicating to save the alphanumeric data input in S9 of FIG. 1302 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 1305 illustrates the data displayed on LCD 201 (FIG. 1) of Communication Device 200 at the time Language Text Data Displaying Software For Word Processor 20654*c*3*b* (FIG. 1304) is implemented. As described in the present drawing, Prompt 20154Pr is displayed on LCD 201 (FIG. 1) at the time Language Text Data Displaying Software For Word Processor 20654*c*3*a* (FIG. 1302) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 1306 illustrates Language Text Data Displaying Software For Explorer 20654*c*4 stored in Multiple Language Displaying Software Storage Area 20654*c* (FIG. 1299) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the steps of S2 through S4 are implemented. Namely, CPU 211 identifies the language item ID 'Language Item#15' in Language Table#1 Storage Area 20654*b*1*a* (FIG. 1293) and displays the corresponding language text data 'My Network' at the predetermined location in the Windows Explorer like software program (S2). CPU 211 identifies the language item ID 'Language Item#16' in Language Table#1 Storage Area 20654*b*1*a* (FIG. 1293) and displays the corresponding language text data 'Trash' at the predetermined location in the Windows Explorer like software program (S3). CPU 211 identifies the language item ID 'Language Item#17' in Language Table#1 Storage Area 20654*b*1*a* (FIG. 1293) and displays the corresponding language text data 'Local Disk' at the predetermined location in the Windows Explorer like software program (S4).

FIG. 1307 illustrates the data displayed on LCD 201 (FIG. 1) of Communication Device 200 at the time Language Text Data Displaying Software For Explorer 20654*c*4 (FIG. 1306) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing Japanese>>

FIG. 1308 illustrates Language Selecting Software 20654*c*1 stored in Multiple Language Displaying Software Storage Area 20654*c* (FIG. 1299) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 1297) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'Japanese' is selected in S3. CPU 211 then identifes the language table ID corresponding to the language type data in Language Type Data Storage Area 20654*b*2 (FIG. 1297), and stores the language table ID (Language Table#2) in Selected Language Table ID Storage Area 20654*b*4 (FIG. 1291) (S4).

FIG. 1309 illustrates Selected Language Displaying Software 20654*c*2 stored in Multiple Language Displaying Software Storage Area 20654*c* (FIG. 1299) which displays and operates with the language selected in S3 of FIG. 1308 (i.e., Japanese). Referring to the present drawing, when Communication Device 200 is powered on (S1), CPU 211 (FIG. 1) of Communication Device 200 retrieves the selected language table ID (Language Table#2) from Selected Language Table ID Storage Area 20654*b*4 (FIG. 1291) (S2). CPU 211 then identifies the storage area corresponding to the language table ID selected in S2 (Language Table#2 Storage Area 20654*b*1*b* (FIG. 1294)) in Language Tables Storage Area 20654*b*1 (FIG. 1292) (S3). Language text data displaying process is initiated thereafter of which the details are described hereinafter (S4).

FIG. 1310 illustrates Language Text Data Displaying Software For Word Processor 20654*c*3*a* stored in Multiple Language Displaying Software Storage Area 20654*c* (FIG. 1299) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#2 Storage Area 20654*b*1*b* (FIG. 1294) and displays the corresponding language text data indicating 'File' in Japanese at the predetermined location in the word processor (S2). CPU 211 identifies the language item ID 'Language Item#9' in Language Table#2 Storage Area 20654*b*1*b* (FIG. 1294) and displays the corresponding language text data indicating 'Edit' in Japanese at the predetermined location in the word processor (S3). CPU 211 identifies the language item ID 'Language Item#10' in Language Table#2 Storage Area 20654*b*1*b* (FIG. 1294) and displays the corresponding language text data indicating 'View' in Japanese at the predetermined location in the word processor (S4). CPU 211 identifies the language item ID 'Language Item#11' in Language Table#2 Storage Area 20654*b*1*b* (FIG. 1294) and displays the corresponding language text data indicating 'Format' in Japanese at the predetermined location in the word processor (S5). CPU 211 identifies the language item ID 'Language Item#12' in Language Table#2 Storage Area 20654*b*1*b* (FIG. 1294) and displays the corresponding language text data indicating 'Tools' in Japanese at the predetermined location in the word processor (S6). CPU 211 identifies the language item ID 'Language Item#13' in Language Table#2 Storage Area 20654*b*1*b* (FIG. 1294) and displays the corresponding language text data indicating 'Window' in Japanese at the predetermined location in the word processor (S7). CPU 211 identifies the language item ID 'Language Item#14' in Language Table#2 Storage Area 20654*b*1*b* (FIG. 1294) and displays the corresponding language text data indicating 'Help' in Japanese at the predetermined location in the word processor (S8). Alphanumeric data is input to the word processor by utilizing Input Device 210 (FIG. 1) or via voice recognition system thereafter (S9).

FIG. 1311 illustrates the data displayed on LCD 201 (FIG. 1) of Communication Device 200 at the time Language Text Data Displaying Software For Word Processor 20654*c*3*a* (FIG. 1310) is implemented. As described in the present drawing, the word processor described in FIG. 1310 is primarily composed of Menu Bar 20154MB and Alphanumeric Data Input Area 20154ADIA wherein the language text data described in S2 through S8 of FIG. 1310 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 1312 illustrates Language Text Data Displaying Software For Word Processor 20654*c*3*b* stored in Multiple Language Displaying Software Storage Area 20654*c* (FIG. 1299) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#2 Storage Area 20654*b*1*b* (FIG. 1294) and displays the corresponding language text data indicating 'Save' in Japanese at the predetermined location in the word processor (S2). CPU 211 identifies the language item ID 'Language Item#19' in Language Table#2 Storage Area 20654*b*1*b* (FIG. 1294) and displays the corresponding language text data indicating 'Yes' in Japanese at the predetermined location in the word processor (S3). CPU 211 identifies the language item ID 'Language Item#20' in Language Table#2 Storage Area 20654*b*1*b* (FIG. 1294) and displays the corresponding language text data indicating 'No' in Japanese at the predetermined location in the word processor (S4). CPU 211 identifies the language item ID 'Language Item#21' in Language Table#2 Storage Area 20654*b*1*b* (FIG. 1294) and displays the corresponding language text data indicating 'Cancel' in Japanese at the predetermined location in the word processor (S5). The save signal indicating to save the alphanumeric data input in S9 of FIG. 1310 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 1313 illustrates the data displayed on LCD 201 (FIG. 1) of Communication Device 200 at the time Language Text Data Displaying Software For Word Processor 20654*c*3*b* (FIG. 1312) is implemented. As described in the present drawing, Prompt 20154Pr is displayed on LCD 201 (FIG. 1) at the time Language Text Data Displaying Software For Word Processor 20654*c*3*a* (FIG. 1310) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 1314 illustrates Language Text Data Displaying Software For Explorer 20654*c*4 stored in Multiple Language Displaying Software Storage Area 20654*c* (FIG. 1299) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#2 Storage Area 20654*b*1*b* (FIG. 1294) and displays the corresponding language text data indicating 'My Network' in Japanese at the predetermined location in the Windows Explorer like software program (S2). CPU 211 identifies the language item ID 'Language Item#16' in Language Table#2 Storage Area 20654*b*1*b* (FIG. 1294) and displays the corresponding language text data indicating 'Trash' in Japanese at the predetermined location in the Windows Explorer like software program (S3). CPU 211 identifies the language item ID 'Language Item#17' in Language Table#2 Storage Area 20654*b*1*b* (FIG. 1294) and displays the corresponding language text data indicating 'Local Disk' in Japanese at the predetermined location in the Windows Explorer like software program (S4).

FIG. 1315 illustrates the data displayed on LCD 201 (FIG. 1) of Communication Device 200 at the time Language Text Data Displaying Software For Explorer 20654*c*4 (FIG. 1314) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing French>>

FIG. 1316 illustrates Language Selecting Software 20654*c*1 stored in Multiple Language Displaying Software Storage Area 20654*c* (FIG. 1299) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 1297) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'French' is selected in S3. CPU 211 then identifies the language table ID corresponding to the language type data in Language Type Data Storage Area 20654*b*2 (FIG. 1297), and stores the language table ID (Language Table#3) in Selected Language Table ID Storage Area 20654*b*4 (FIG. 1291) (S4).

FIG. 1317 illustrates Selected Language Displaying Software 20654*c*2 stored in Multiple Language Displaying Software Storage Area 20654*c* (FIG. 1299) which displays and operates with the language selected in S3 of FIG. 1316 (i.e., French). Referring to the present drawing, when Communication Device 200 is powered on (S1), CPU 211 (FIG. 1) of Communication Device 200 retrieves the selected language table ID (Language Table#3) from Selected Language Table ID Storage Area 20654*b*4 (FIG. 1291) (S2). CPU 211 then identifies the storage area corresponding to the language table ID selected in S2 (Language Table#3 Storage Area 20654*b*1*c* (FIG. 1295)) in Language Tables Storage Area 20654*b*1 (FIG. 1292) (S3). Language text data displaying process is initiated thereafter of which the details are described hereinafter (S4).

FIG. 1318 illustrates Language Text Data Displaying Software For Word Processor 20654*c*3*a* stored in Multiple Language Displaying Software Storage Area 20654*c* (FIG. 1299) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#3 Storage Area 20654*b*1*c* (FIG. 1295) and displays the corresponding language text data "French#8" indicating 'File' in French at the predetermined location in the word processor (S2). CPU 211 identifies the language item ID 'Language Item#9' in Language Table#3 Storage Area 20654*b*1*c* (FIG. 1295) and displays the corresponding language text data "French#9" indicating 'Edit' in French at the predetermined location in the word processor (S3). CPU 211 identifies the language item ID 'Language Item#10' in Language Table#3 Storage Area 20654*b*1*c* (FIG. 1295) and displays the corresponding language text data "French#10" indicating 'View' in French at the predetermined location in the word processor (S4). CPU 211 identifies the language item ID 'Language Item#11' in Language Table#3 Storage Area 20654*b*1*c* (FIG. 1295) and displays the corresponding language text data "French#11" indicating 'Format' in French at the predetermined location in the word processor (S5). CPU 211 identifies the language item ID 'Language Item#12' in Language Table#3 Storage Area 20654*b*1*c* (FIG. 1295) and displays the corresponding language text data "French#12" indicating 'Tools' in French at the predetermined location in the word processor (S6). CPU 211 identifies the language item ID 'Language Item#13' in Language Table#3 Storage Area 20654*b*1*c* (FIG. 1295) and displays the corresponding language text data "French#13" indicating 'Window' in French at the predetermined location in the word processor (S7). CPU 211 identifies the language item ID 'Language Item#14' in Language Table#3 Storage Area 20654*b*1*c* (FIG. 1295) and displays the corresponding language text data "French#14" indicating 'Help' in French at the predetermined location in the word processor (S8). Alphanumeric data is input to the word processor by utilizing Input Device 210 (FIG. 1) or via voice recognition system thereafter (S9).

FIG. 1319 illustrates the data displayed on LCD 201 (FIG. 1) of Communication Device 200 at the time Language Text Data Displaying Software For Word Processor 20654*c*3*a* (FIG. 1318) is implemented. As described in the present drawing, the word processor described in FIG. 1318 is primarily composed of Menu Bar 20154MB and Alphanumeric Data Input Area 20154ADIA wherein the language text data described in S2 through S8 of FIG. 1318 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 1320 illustrates Language Text Data Displaying Software For Word Processor 20654*c*3*b* stored in Multiple Language Displaying Software Storage Area 20654*c* (FIG. 1299) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#3 Storage Area 20654*b*1*c* (FIG. 1295) and displays the corresponding language text data "French#18" indicating 'Save' in French at the predetermined location in the word processor (S2). CPU 211 identifies the language item ID 'Language Item#19' in Language Table#3 Storage Area 20654*b*1*c* (FIG. 1295) and displays the corresponding language text data "French#19" indicating 'Yes' in French at the predetermined location in the word processor (S3). CPU 211 identifies the language item ID 'Language Item#20' in Language Table#3 Storage Area 20654*b*1*c* (FIG. 1295) and displays the corresponding language text data "French#20" indicating 'No' in French at the predetermined location in the word processor (S4). CPU 211 identifies the language item ID 'Language Item#21' in Language Table#3 Storage Area 20654*b*1*c* (FIG. 1295) and displays the corresponding language text data "French#21" indicating 'Cancel' in French at the predetermined location in the word processor (S5). The save signal indicating to save the alphanumeric data input in S9 of FIG. 1318 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 1321 illustrates the data displayed on LCD 201 (FIG. 1) of Communication Device 200 at the time Language Text Data Displaying Software For Word Processor 20654*c*3*b* (FIG. 1320) is implemented. As described in the present drawing, Prompt 20154Pr is displayed on LCD 201 (FIG. 1) at the time Language Text Data Displaying Software For Word Processor 20654*c*3*a* (FIG. 1318) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 1322 illustrates Language Text Data Displaying Software For Explorer 20654*c*4 stored in Multiple Language Displaying Software Storage Area 20654*c* (FIG. 1299) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#3 Storage Area 20654*b*1*c* (FIG. 1295) and displays the corresponding language text data "French#15" indicating 'My Network' in French at the predetermined location in the Windows Explorer like software program (S2). CPU 211 identifies the language item ID 'Language Item#16' in Language Table#3 Storage Area 20654*b*1*c* (FIG. 1295) and displays the corresponding language text data "French#16" indicating 'Trash' in French at the predetermined location in the Windows Explorer like software program (S3). CPU 211 identifies the language item ID 'Language Item#17' in Language Table#3 Storage Area 20654*b*1*c* (FIG. 1295) and displays the corresponding language text data "French#17" indicating 'Local Disk' in French at the predetermined location in the Windows Explorer like software program (S4).

FIG. 1323 illustrates the data displayed on LCD 201 (FIG. 1) of Communication Device 200 at the time Language Text Data Displaying Software For Explorer 20654*c*4 (FIG. 1322) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing German>>

FIG. 1324 illustrates Language Selecting Software 20654*c*1 stored in Multiple Language Displaying Software Storage Area 20654*c* (FIG. 1299) which selects the language utilized to operate Communication Device 200 from a plurality of languages. Referring to the present drawing, CPU 211 (FIG. 1) of Communication Device 200 retrieves the language type data from Language Type Data Storage Area 20654*b*2 (FIG. 1297) (S1), and Displays a list of available languages on LCD 201 (FIG. 1) (S2). In the present example, the following languages are displayed on LCD 201: English, Japanese, French, and German. A certain language is selected therefrom by utilizing Input Device 210 (FIG. 1) or via voice recognition system (S3). Assume that 'German' is selected in S3. CPU 211 then identifies the language table ID corresponding to the language type data in Language Type Data Storage Area 20654*b*2 (FIG. 1297), and stores the language table ID (Language Table#4) in Selected Language Table ID Storage Area 20654*b*4 (FIG. 1291) (S4).

FIG. 1325 illustrates Selected Language Displaying Software 20654*c*2 stored in Multiple Language Displaying Software Storage Area 20654*c* (FIG. 1299) which displays and operates with the language selected in S3 of FIG. 1324 (i.e., German). Referring to the present drawing, when Communication Device 200 is powered on (S1), CPU 211 (FIG. 1) of Communication Device 200 retrieves the selected language table ID (Language Table#4) from Selected Language Table ID Storage Area 20654*b*4 (FIG. 1291) (S2). CPU 211 then identifies the storage area corresponding to the language table ID selected in S2 (Language Table#4 Storage Area 20654*b*1*d* (FIG. 1296)) in Language Tables Storage Area 20654*b*1 (FIG. 1292) (S3). Language text data displaying process is initiated thereafter of which the details are described hereinafter (S4).

FIG. 1326 illustrates Language Text Data Displaying Software For Word Processor 20654*c*3*a* stored in Multiple Language Displaying Software Storage Area 20654*c* (FIG. 1299) which displays the language text data at the time a word processor, such as MS Word and WordPerfect is executed. Referring to the present drawing, CPU 211 (FIG. 1) of Communication Device 200 executes a word processor in response to the signal input by the user of Communication Device 200 indicating to activate and execute the word processor (S1). In the process of displaying the word processor on LCD 201 (FIG. 1), the following steps of S2 through S8 are implemented. Namely, CPU 211 identifies the language item ID 'Language Item#8' in Language Table#4 Storage Area 20654*b*1*d* (FIG. 1296) and displays the corresponding language text data "German#8" indicating 'File' in German at the predetermined location in the word processor (S2). CPU 211 identifies the language item ID 'Language Item#9' in Language Table#4 Storage Area 20654*b*1*d* (FIG. 1296) and displays the corresponding language text data "German#9" indicating 'Edit' in German at the predetermined location in the word processor (S3). CPU 211 identifies the language item ID 'Language Item#10' in Language Table#4 Storage Area 20654*b*1*d* (FIG. 1296) and displays the corresponding language text data "German#10" indicating 'View' in German at the predetermined location in the word processor (S4). CPU 211 identifies the language item ID 'Language Item#11' in Language Table#4 Storage Area 20654*b*1*d* (FIG. 1296) and displays the corresponding language text data "German#11" indicating 'Format' in German at the predetermined location in the word processor (S5). CPU 211 identifies the language item ID 'Language Item#12' in Language Table#4 Storage Area 20654*b*1*d* (FIG. 1296) and displays the corresponding language text data "German#12" indicating 'Tools' in German at the predetermined location in the word processor (S6). CPU 211 identifies the language item ID 'Language Item#13' in Language Table#4 Storage Area 20654*b*1*d* (FIG. 1296) and displays the corresponding language text data "German#13" indicating 'Window' in German at the predetermined location in the word processor (S7). CPU 211 identifies the language item ID 'Language Item#14' in Language Table#4 Storage Area 20654*b*1*d* (FIG. 1296) and displays the corresponding language text data "German#14" indicating 'Help' in German at the predetermined location in the word processor (S8). Alphanumeric data is input to the word processor by utilizing Input Device 210 (FIG. 1) or via voice recognition system thereafter (S9).

FIG. 1327 illustrates the data displayed on LCD 201 (FIG. 1) of Communication Device 200 at the time Language Text Data Displaying Software For Word Processor 20654*c*3*a* (FIG. 1326) is implemented. As described in the present drawing, the word processor described in FIG. 1326 is primarily composed of Menu Bar 20154MB and Alphanumeric Data Input Area 20154ADIA wherein the language text data described in S2 through S8 of FIG. 1326 are displayed on Menu Bar 20154MB and alphanumeric data are input in Alphanumeric Data Input Area 20154ADIA. In the example described in the present drawing, 20154MBF is the language text data processed in S2 of the previous drawing; 20154MBE is the language text data processed in S3 of the previous drawing; 20154MBV is the language text data processed in S4 of the previous drawing; 20154MBF is the language text data processed in S5 of the previous drawing; 20154MBT is the language text data processed in S6 of the previous drawing; 20154MBW is the language text data processed in S7 of the previous drawing; and 20154MBH is the language text data processed in S8 of the previous drawing.

FIG. 1328 illustrates Language Text Data Displaying Software For Word Processor 20654*c*3*b* stored in Multiple Language Displaying Software Storage Area 20654*c* (FIG. 1299) which displays a prompt on LCD 201 (FIG. 1) at the time a word processor is closed. Referring to the present drawing, CPU 211 (FIG. 1) of Communication Device 200 initiates the closing process of the word processor in response to the signal input by the user of Communication Device 200 indicating to close the word processor (S1). In the process of closing the word processor, the following steps of S2 through S5 are implemented. Namely, CPU 211 identifies the language item ID 'Language Item#18' in Language Table#4 Storage Area 20654*b*1*d* (FIG. 1296) and displays the corresponding language text data "German#18" indicating 'Save' in German at the predetermined location in the word processor (S2). CPU 211 identifies the language item ID 'Language Item#19' in Language Table#4 Storage Area 20654*b*1*d* (FIG. 1296) and displays the corresponding language text data "German#19" indicating 'Yes' in German at the predetermined location in the word processor (S3). CPU 211 identifies the language item ID 'Language Item#20' in Language Table#4 Storage Area 20654*b*1*d* (FIG. 1296) and displays the corresponding language text data "German#20" indicating 'No' in German at the predetermined location in the word processor (S4). CPU 211 identifies the language item ID 'Language Item#21' in Language Table#4 Storage Area 20654*b*1*d* (FIG. 1296) and displays the corresponding language text data "German#21" indicating 'Cancel' in German at the predetermined location in the word processor (S5). The save signal indicating to save the alphanumeric data input in S9 of FIG. 1326 is input by utilizing Input Device 210 (FIG. 1) or via voice recognition system, assuming that the user of Communication Device 200 intends to save the data (S6), and the data are saved in a predetermined location in RAM 206 (FIG. 1) (S7). The word processor is closed thereafter (S8).

FIG. 1329 illustrates the data displayed on LCD 201 (FIG. 1) of Communication Device 200 at the time Language Text Data Displaying Software For Word Processor 20654*c*3*b* (FIG. 1328) is implemented. As described in the present drawing, Prompt 20154Pr is displayed on LCD 201 (FIG. 1) at the time Language Text Data Displaying Software For Word Processor 20654*c*3*a* (FIG. 1326) is closed. As described in the present drawing, Prompt 20154Pr is primarily composed of 20154PrS, 20154PrY, 20154PrN, and 20154PrC. In the example described in the present drawing, 20154PrS is the language text data processed in S2 of the previous drawing; 20154PrY is the language text data processed in S3 of the previous drawing; 20154PrN is the language text data processed in S4 of the previous drawing; and 20154PrC is the language text data processed in S5 of the previous drawing.

FIG. 1330 illustrates Language Text Data Displaying Software For Explorer 20654*c*4 stored in Multiple Language Displaying Software Storage Area 20654*c* (FIG. 1299) which displays the language text data at the time a Windows Explorer like software program which displays folders and/or directories and the structures thereof is executed. Referring to the present drawing, CPU 211 (FIG. 1) of Communication Device 200 executes Windows Explorer like software program in response to the signal input by the user of Communication Device 200 indicating to activate and execute the software program (S1). In the process of displaying the Windows Explorer like software program on LCD 201 (FIG. 1), the following steps of S2 through S4 are implemented. Namely, CPU 211 identifies the language item ID 'Language Item#15' in Language Table#4 Storage Area 20654*b*1*d* (FIG. 1296) and displays the corresponding language text data "German#15" indicating 'My Network' in German at the predetermined location in the Windows Explorer like software program (S2). CPU 211 identifies the language item ID 'Language Item#16' in Language Table#4 Storage Area 20654*b*1*d* (FIG. 1296) and displays the corresponding language text data "German#16" indicating 'Trash' in German at the predetermined location in the Windows Explorer like software program (S3). CPU 211 identifies the language item ID 'Language Item#17' in Language Table#4 Storage Area 20654*b*1*d* (FIG. 1296) and displays the corresponding language text data "German#17" indicating 'Local Disk' in German at the predetermined location in the Windows Explorer like software program (S4).

FIG. 1331 illustrates the data displayed on LCD 201 (FIG. 1) of Communication Device 200 at the time Language Text Data Displaying Software For Explorer 20654*c*4 (FIG. 1330) is executed. As described in the present drawing, 20154LD, 20154MN, and 20154Tr are displayed on LCD 201 (FIG. 1) at the time Language Text Data Displaying Software For Explorer 20654*c*4 is executed. As described in the present drawing, 20154LD is the language text data processed in S4 of the previous drawing; 20154MN is the language text data processed in S2 of the previous drawing; and 20154Tr is the language text data processed in S3 of the previous drawing.

<<Multiple Language Displaying Function—Utilizing Other Languages>>

For the avoidance of doubt, the present function is not limited to select a language, to operate Communication Device 200, only from the foregoing four languages of English, Japanese, French, and German. The present function is also capable to select a language from Dutch, Chinese, Arabic, Korean, Spanish, Italian, and any other languages existing in this world, in addition to the foregoing four languages.

<<Multiple Language Displaying Function—Summary>>

(1) A communication device comprising a microphone, a speaker, a display, an input device and a multiple mode implementor, wherein said multiple mode implementor implements a voice communication mode and a multiple language displaying mode, a series of audio data are input to and output from said microphone and said speaker respectively when said voice communication mode is implemented, a language utilized to operate said communication device is selected from a plurality of languages when said multiple language displaying mode is implemented.

(2) A multiple language displaying software program wherein a language utilized to operate said communication device is selected from a plurality of languages.

(3) Said plurality of languages in summary (1) or (2) includes three languages or more.

(4) Said plurality of languages in summary (1) or (2) includes four languages or more.

<<Caller's Information Displaying Function>>

FIGS. 1332 through 1375 illustrate the Caller"s Information displaying function which displays the Information regarding the caller (e.g., name, phone number, email address, and home address, etc.) on LCD 201 (FIG. 1) when Communication Device 200 is utilized as a 'TV phone'.

FIGS. 1332 through 1339 illustrate the data and software programs stored in RAM 206 (FIG. 1) of Caller's Device, a Communication Device 200, utilized by the caller.

FIGS. 1340 through 1347 illustrate the data and software programs stored in RAM 206 (FIG. 1) of Callee's Device, a Communication Device 200, utilized by the callee.

FIGS. 1348 through 1351 illustrate the data and software programs stored in Host H (FIG. 429).

FIG. 1332 illustrates the storage area included in RAM 206 (FIG. 1) of Caller's Device. As described in the present drawing, RAM 206 of Caller's Device includes Caller's Information Displaying Information Storage Area 20655*a* of which the data and the software programs stored therein are described in FIG. 1333.

FIG. 1333 illustrates the storage areas included in Caller's Information Displaying Information Storage Area 20655*a* (FIG. 1332). As described in the present drawing, Caller's Information Displaying Information Storage Area 20655*a* includes Caller's Information Displaying Data Storage Area 20655*b* and Caller's Information Displaying Software Storage Area 20655*c*. Caller's Information Displaying Data Storage Area 20655*b* stores the data necessary to implement the present function on the side of Caller's Device, such as the ones described in FIGS. 1334 through 1338. Caller's Information Displaying Software Storage Area 20655*c* stores the software programs necessary to implement the present function on the side of Caller's Device, such as the ones described in FIG. 1339.

FIG. 1334 illustrates the storage areas included in Caller's Information Displaying Data Storage Area 20655*b*. As described in the present drawing, Caller's Information Displaying Data Storage Area 20655*b* includes Caller's Audiovisual Data Storage Area 20655*b*1, Callee's Audiovisual Data Storage Area 20655*b*2, Caller's Personal Data Storage Area 20655*b*3, Callee's Personal Data Storage Area 20655*b*4, Caller's Calculated GPS Data Storage Area 20655*b*5, Callee's Calculated GPS Data Storage Area 20655*b*6, Caller's Map Data Storage Area 20655*b*7, Callee's Map Data Storage Area 20655*b*8, and Work Area 20655*b*9. Caller's Audiovisual Data Storage Area 20655*b*1 stores the data described in FIG. 1335. Callee's Audiovisual Data Storage Area 20655*b*2 stores the data described in FIG. 1336. Caller's Personal Data Storage Area 20655*b*3 stores the data described in FIG. 1337. Callee's Personal Data Storage Area 20655*b*4 stores the data described in FIG. 1338. Caller's Calculated GPS Data Storage Area 20655*b*5 stores the caller's calculated GPS data which represents the current geographic location of Caller"s Device in (x, y, z) format. Callee's Calculated GPS Data Storage Area 20655*b*6 stores the callee's calculated GPS data which represents the current geographic location of Callee"s Device in (x, y, z) format. Caller's Map Data Storage Area 20655*b*7 stores the map data representing the surrounding area of the location indicated by the caller's calculated GPS data. Callee's Map Data Storage Area 20655*b*8 stores the map data representing the surrounding area of the location indicated by the callee's calculated GPS data. Work Area 20655*b*9 is a storage area utilized to perform calculation and to temporarily store data.

FIG. 1335 illustrates the storage areas included in Caller's Audiovisual Data Storage Area 20655*b*1 (FIG. 1334). As described in the present drawing, Caller's Audiovisual Data Storage Area 20655*b*1 includes Caller's Audio Data Storage Area 20655*b*1*a* and Caller's Visual Data Storage Area 20655*b*1*b*. Caller's Audio Data Storage Area 20655*b*1*a* stores the caller's audio data which represents the audio data input via Microphone 215 (FIG. 1) of Caller's Device. Caller's Visual Data Storage Area **20655*b*1*b* stores the caller's visual data which represents the visual data input via CCD Unit 214 (FIG. 1**) of Caller's Device.

FIG. 1336 illustrates the storage areas included in Callee's Audiovisual Data Storage Area **20655*b*2 (FIG. 1334). As described in the present drawing, Callee's Audiovisual Data Storage Area 20655*b*2 includes Callee's Audio Data Storage Area 20655*b*2*a* and Callee's Visual Data Storage Area 20655*b*2*b*. Callee's Audio Data Storage Area 20655*b*2*a* stores the callee's audio data which represents the audio data sent from Callee's Device. Callee's Visual Data Storage Area 20655*b*2*b*** stores the callee's visual data which represents the visual data sent from Callee's Device.

FIG. 1337 illustrates the data stored in Caller's Personal Data Storage Area **20655*b*3 (FIG. 1334). As described in the present drawing, Caller's Personal Data Storage Area 20655*b*3 comprises two columns, i.e., 'Caller's Personal Data' and 'Permitted Caller's Personal Data Flag'. Column 'Caller's Personal Data' stores the caller's personal data which represent the personal data of the caller. Column 'Permitted Caller's Personal Data Flag' stores the permitted caller's personal data flag and each permitted caller's personal data flag represents whether the corresponding caller's personal data is permitted to be displayed on Callee's Device. The permitted caller's personal data flag is represented by either '1' or '0' wherein '1' indicates that the corresponding caller's personal data is permitted to be displayed on Callee's Device, and '0' indicates that the corresponding caller's personal data is not permitted to be displayed on Callee's Device. In the example described in the present drawing, Caller's Personal Data Storage Area 20655*b*3** stores the following data: the caller"s name and the corresponding permitted caller's personal data flag '1'; the caller"s phone number and the corresponding permitted caller's personal data flag '1'; the caller"s email address and the corresponding permitted caller's personal data flag '1'; the caller"s home address and the corresponding permitted caller's personal data flag '1'; the caller"s business address and the corresponding permitted caller's personal data flag '0'; the caller"s title and the corresponding permitted caller's personal data flag '0'; the caller"s hobby and the corresponding permitted caller's personal data flag '0'; the caller"s blood type and the corresponding permitted caller's personal data flag '0'; the caller"s gender and the corresponding permitted caller's personal data flag '0'; the caller"s age and the corresponding permitted caller's personal data flag '0'; and caller's date of birth and the corresponding permitted caller's personal data flag '0'.

FIG. 1338 illustrates the data stored in Callee's Personal Data Storage Area **20655*b*4 (FIG. 1334). As described in the present drawing, Callee's Personal Data Storage Area 20655*b*4 stores the callee's personal data which represent the personal data of the callee which are displayed on LCD 201 (FIG. 1) of Caller's Device. In the example described in the present drawing, Callee's Personal Data Storage Area 20655*b*4** stores the callee's name and phone number.

FIG. 1339 illustrates the software programs stored in Caller's Information Displaying Software Storage Area **20655*c* (FIG. 1333). As described in the present drawing, Caller's Information Displaying Software Storage Area 20655*c* stores Permitted Caller's Personal Data Selecting Software 20655*c*1, Dialing Software 20655*c*2, Caller's Device Pin-pointing Software 20655*c*3, Map Data Sending/Receiving Software 20655*c*4, Caller's Audiovisual Data Collecting Software 20655*c*5, Caller's Information Sending/Receiving Software 20655*c*6, Callee's Information Sending/Receiving Software 20655*c*6*a*, Permitted Callee's Personal Data Displaying Software 20655*c*7, Map Displaying Software 20655*c*8, Callee's Audio Data Outputting Software 20655*c*9, and Callee's Visual Data Displaying Software 20655*c*10. Permitted Caller's Personal Data Selecting Software 20655*c*1 is the software program described in FIG. 1352. Dialing Software 20655*c*2 is the software program described in FIG. 1353. Caller's Device Pin-pointing Software 20655*c*3 is the software program described in FIGS. 1354 and 1355. Map Data Sending/Receiving Software 20655*c*4 is the software program described in FIG. 1356. Caller's Audiovisual Data Collecting Software 20655*c*5 is the software program described in FIG. 1357. Caller's Information Sending/Receiving Software 20655*c*6 is the software program described in FIG. 1358. Callee's Information Sending/Receiving Software 20655*c*6*a* is the software program described in FIG. 1371. Permitted Callee's Personal Data Displaying Software 20655*c*7 is the software program described in FIG. 1372. Map Displaying Software 20655*c*8 is the software program described in FIG. 1373. Callee's Audio Data Outputting Software 20655*c*9 is the software program described in FIG. 1374. Callee's Visual Data Displaying Software 20655*c*10 is the software program described in FIG. 1375**.

FIG. 1340 illustrates the storage area included in RAM 206A (FIG. 1) of Callee's Device. As described in the present drawing, RAM 206A of Callee's Device includes Callee"s Information Displaying Information Storage Area **20655*a*A of which the data and the software programs stored therein are described in FIG. 1341**.

FIG. 1341 illustrates the storage areas included in Callee"s Information Displaying Information Storage Area **20655*a*A (FIG. 1340). As described in the present drawing, Callee"s Information Displaying Information Storage Area 20655*a*A includes Callee"s Information Displaying Data Storage Area 20655*b*A and Callee"s Information Displaying Software Storage Area 20655*c*A. Callee"s Information Displaying Data Storage Area 20655*b*A stores the data necessary to implement the present function on the side of Callee's Device, such as the ones described in FIGS. 1342 through 1346. Callee"s Information Displaying Software Storage Area 20655*c*A stores the software programs necessary to implement the present function on the side of Callee"s Device, such as the ones described in FIG. 1347**.

FIG. 1342 illustrates the storage areas included in Callee"s Information Displaying Data Storage Area **20655*b*A. As described in the present drawing, Callee"s Information Displaying Data Storage Area 20655*b*A includes Caller"s Audiovisual Data Storage Area 20655*b*1A, Callee"s Audiovisual Data Storage Area 20655*b*2A, Caller"s Personal Data Storage Area 20655*b*3A, Callee"s Personal Data Storage Area 20655*b*4A, Caller"s Calculated GPS Data Storage Area 20655*b*5A, Callee"s Calculated GPS Data Storage Area 20655*b*6A, Caller"s Map Data Storage Area 20655*b*7A, Callee"s Map Data Storage Area 20655*b*8A, and Work Area 20655*b*9A. Caller"s Audiovisual Data Storage Area 20655*b*1A stores the data described in FIG. 1343. Callee"s Audiovisual Data Storage Area 20655*b*2A stores the data described in FIG. 1344. Caller"s Personal Data Storage Area 20655*b*3A stores the data described in FIG. 1345. Callee"s Personal Data Storage Area 20655*b*4A stores the data described in FIG. 1346. Caller"s Calculated GPS Data Storage Area 20655*b*5A stores the caller's calculated GPS data which represents the current geographic location of Caller"s Device in (x, y, z) format. Callee"s Calculated GPS Data Storage Area 20655*b*6A stores the callee's calculated GPS data which represents the current geographic location of Callee"s Device in (x, y, z) format. Caller"s Map Data Storage Area 20655*b*7A stores the map data representing the surrounding area of the location indicated by the caller's calculated GPS data. Callee"s Map Data Storage Area 20655*b*8A stores the map data representing the surrounding area of the location indicated by the callee's calculated GPS data. Work Area 20655*b*9**A is a storage area utilized to perform calculation and to temporarily store data.

FIG. 1343 illustrates the storage areas included in Caller"s Audiovisual Data Storage Area **20655*b*1A (FIG. 1342). As described in the present drawing, Caller"s Audiovisual Data Storage Area 20655*b*1A includes Caller"s Audio Data Storage Area 20655*b*1*a*A and Caller"s Visual Data Storage Area 20655*b*1*b*A. Caller"s Audio Data Storage Area 20655*b*1*a*A stores the caller's audio data which represents the audio data sent from Caller"s Device in a wireless fashion. Caller"s Visual Data Storage Area 20655*b*1*b***A stores the caller's visual data which represents the visual data input sent from Caller's Device in a wireless fashion.

FIG. 1344 illustrates the storage areas included in Callee"s Audiovisual Data Storage Area **20655*b*2A (FIG. 1342). As described in the present drawing, Callee"s Audiovisual Data Storage Area 20655*b*2A includes Callee"s Audio Data Storage Area 20655*b*2*a*A and Callee"s Visual Data Storage Area 20655*b*2*b*A. Callee"s Audio Data Storage Area 20655*b*2*a*A stores the callee's audio data which represents the audio data input via Microphone 215 (FIG. 1) of Callee's Device. Callee"s Visual Data Storage Area 20655*b*2*b*A stores the callee's visual data which represents the visual data input via CCD Unit 214 (FIG. 1**) of Callee's Device.

FIG. 1345 illustrates the data stored in Caller"s Personal Data Storage Area **20655*b*3A (FIG. 1342). As described in the present drawing, Caller"s Personal Data Storage Area 20655*b*3A stores the caller's personal data which represent the personal data of the caller which are displayed on LCD 201 (FIG. 1) of Caller's Device. In the example described in the present drawing, Caller"s Personal Data Storage Area 20655*b*3**A stores the caller's name, phone number, email address, and home address.

FIG. 1346 illustrates the data stored in Callee"s Personal Data Storage Area **20655*b*4A (FIG. 1342). As described in the present drawing, Callee"s Personal Data Storage Area 20655*b*4A comprises two columns, i.e., 'Callee's Personal Data' and 'Permitted Callee's Personal Data Flag'. Column 'Callee's Personal Data' stores the callee's personal data which represent the personal data of the callee. Column 'Permitted Callee's Personal Data Flag' stores the permitted callee's personal data flag and each permitted callee's personal data flag represents whether the corresponding callee's personal data is permitted to be displayed on Caller's Device. The permitted callee's personal data flag is represented by either '1' or '0' wherein '1' indicates that the corresponding callee's personal data is permitted to be displayed on Caller's Device, and '0' indicates that the corresponding callee's personal data is not permitted to be displayed on Caller's Device. In the example described in the present drawing, Callee's Personal Data Storage Area 20655*b*4**A stores the following data: callee's name and the corresponding permitted callee's personal data flag '1'; the callee"s phone number and the corresponding permitted callee's personal data flag '1'; the callee"s email address and the corresponding permitted caller's personal data flag '0'; the callee"s home address and the corresponding permitted callee's personal data flag '0'; the callee"s business address and the corresponding permitted callee's personal data flag '0'; the callee"s title and the corresponding permitted callee's personal data flag '0'; the callee"s hobby and the corresponding permitted callee's personal data flag '0'; the callee"s blood type and the corresponding permitted callee's personal data flag '0'; the callee"s gender and the corresponding permitted callee's personal data flag '0'; the callee"s age and the corresponding permitted callee's personal data flag '0'; and callee's date of birth and the corresponding permitted callee's personal data flag '0'.

FIG. 1347 illustrates the software programs stored in Callee"s Information Displaying Software Storage Area **20655*c*A (FIG. 1341). As described in the present drawing, Callee"s Information Displaying Software Storage Area 20655*c*A stores Permitted Callee"s Personal Data Selecting Software 20655*c*1A, Dialing Software 20655*c*2A, Callee"s Device Pin-pointing Software 20655*c*3A, Map Data Sending/Receiving Software 20655*c*4A, Callee"s Audiovisual Data Collecting Software 20655*c*5A, Callee"s Information Sending/Receiving Software 20655*c*6A, Caller"s Information Sending/Receiving Software 20655*c*6*a*A, Permitted Caller"s Personal Data Displaying Software 20655*c*7A, Map Displaying Software 20655*c*8A, Caller"s Audio Data Outputting Software 20655*c*9A, and Caller"s Visual Data Displaying Software 20655*c*10A. Permitted Callee"s Personal Data Selecting Software 20655*c*1A is the software program described in FIG. 1364. Dialing Software 20655*c*2A is the software program described in FIG. 1365. Callee"s Device Pin-pointing Software 20655*c*3A is the software program described in FIGS. 1366 and 1367. Map Data Sending/Receiving Software 20655*c*4A is the software program described in FIG. 1368. Callee"s Audiovisual Data Collecting Software 20655*c*5A is the software program described in FIG. 1369. Callee"s Information Sending/Receiving Software 20655*c*6A is the software program described in FIG. 1370. Caller"s Information Sending/Receiving Software 20655*c*6*a*A is the software program described in FIG. 1359. Permitted Caller"s Personal Data Displaying Software 20655*c*7A is the software program described in FIG. 1360. Map Displaying Software 20655*c*8A is the software program described in FIG. 1361. Caller"s Audio Data Outputting Software 20655*c*9A is the software program described in FIG. 1362. Caller"s Visual Data Displaying Software 20655*c*10A is the software program described in FIG. 1363**.

FIG. 1348 illustrates the storage area included in Host H (FIG. 429). As described in the present drawing, Host H includes Caller/Callee Information Storage Area H**55*a* of which the data and the software programs stored therein are described in FIG. 1349**.

FIG. 1349 illustrates the storage areas included in Caller/Callee Information Storage Area H**55*a*. As described in the present drawing, Caller/Callee Information Storage Area H55*a* includes Caller/Callee Data Storage Area H55*b* and Caller/Callee Software Storage Area H55*c*. Caller/Callee Data Storage Area H55*b* stores the data necessary to implement the present function on the side of Host H (FIG. 429), such as the ones described in FIG. 1350. Caller/Callee Software Storage Area H55*c* stores the software programs necessary to implement the present function on the side of Host H, such as the ones described in FIG. 1351**.

FIG. 1350 illustrates the storage areas included in Caller/Callee Data Storage Area H**55*b*. As described in the present drawing, Caller/Callee Data Storage Area H55*b* includes Caller's Information Storage Area H55*b*1, Callee's Information Storage Area H55*b*2, Map Data Storage Area H55*b*3, Work Area h55*b*4, Caller's Calculated GPS Data Storage Area H55*b*5, and Callee's Calculated GPS Data Storage Area H55*b*6. Caller's Information Storage Area H55*b*1 stores the Caller"s Information received Caller's Device. Callee's Information Storage Area H55*b*2 stores the Callee"s Information received Callee's Device. Map Data Storage Area H55*b*3** stores the map data received from Caller's Device and Callee's Device. Work Area H55*b*4 is a storage area utilized to perform calculation and to temporarily store data. Caller's Calculated GPS Data Storage Area H55*b*5 stores the caller's calculated GPS data. Callee's Calculated GPS Data Storage Area H55*b*6 stores the callee's calculated GPS data.

FIG. 1351 illustrates the software programs stored in Caller/Callee Software Storage Area H55*c* (FIG. 1351). As described in the present drawing, Caller/Callee Software Storage Area H55*c* stores Dialing Software H55*c*2, Caller's Device Pin-pointing Software H55*c*3, Callee's Device Pin-pointing Software H55*c*3*a*, Map Data Sending/Receiving Software H55*c*4, Caller's Information Sending/Receiving Software H55*c*6, and Callee's Information Sending/Receiving Software H55*c*6*a*. Dialing Software H55*c*2 is the software program described in FIGS. 1353 and 1365. Caller's Device Pin-pointing Software H55*c*3 is the software program described in FIG. 1354. Callee's Device Pin-pointing Software H55*c*3*a* is the software program described in FIG. 1366. Map Data Sending/Receiving Software H55*c*4 is the software program described in FIGS. 1356 and 1368. Caller's Information Sending/Receiving Software H55*c*6 is the software program described in FIG. 1358. Callee's Information Sending/Receiving Software H55*c*6*a* is the software program described in FIGS. 1370 and 1371.

FIGS. 1352 through 1363 primarily illustrate the sequence to output the Caller"s Information (which is defined hereinafter) from Callee's Device.

FIG. 1352 illustrates Permitted Caller's Personal Data Selecting Software **20655*c*1 stored in Caller's Information Displaying Software Storage Area 20655*c* (FIG. 1339) of Caller's Device, which selects the permitted caller's personal data to be displayed on LCD 201 (FIG. 1) of Callee's Device. Referring to the present drawing, CPU 211 (FIG. 1) of Caller's Device retrieves all of the caller's personal data from Caller's Personal Data Storage Area 20655*b*3 (FIG. 1337) (S1). CPU 211 then displays a list of caller's personal data on LCD 201 (FIG. 1) (S2). The caller selects, by utilizing Input Device 210 (FIG. 1) or via voice recognition system, the caller's personal data permitted to be displayed on Callee's Device (S3). The permitted caller's personal data flag of the data selected in S3 is registered as '1' (S4**).

FIG. 1353 illustrates Dialing Software H55*c*2 stored in Caller/Callee Software Storage Area H55*c* (FIG. 1351) of Host H (FIG. 429), Dialing Software **20655*c*2 stored in Caller's Information Displaying Software Storage Area 20655*c* (FIG. 1339) of Caller's Device, and Dialing Software 20655*c*2A stored in Callee's Information Displaying Software Storage Area 20655*c*A (FIG. 1347) of Callee's Device, which enables to connect between Caller's Device and Callee's Device via Host H (FIG. 429) in a wireless fashion. Referring to the present drawing, a connection is established between Caller's Device and Host H (S1). Next, a connection is established between Host H and Callee's Device (S2**). As a result, Caller's Device and Callee's Device are able to exchange audiovisual data, text data, and various types of data with each other. The connection is maintained until Caller"s Device, Host H, or Callee"s Device terminates the connection.

FIG. 1354 illustrates Caller's Device Pin-pointing Software H55*c*3 (FIG. 1351) stored in Caller/Callee Software Storage Area H55*c* (FIG. 1351) of Host H (FIG. 429) and Caller's Device Pin-pointing Software **20655*c*3 stored in Caller's Information Displaying Software Storage Area 20655*c* (FIG. 1339) of Caller's Device, which identifies the current geographic location of Caller's Device. Referring to the present drawing, CPU 211 (FIG. 1) of Caller's Device collects the GPS raw data from the near base stations (S1). CPU 211 sends the raw GPS data to Host H (S2). Upon receiving the raw GPS data (S3), Host H produces the caller"s calculated GPS data by referring to the raw GPS data (S4**). Host H stores the caller"s calculated GPS data in Caller's Calculated GPS Data Storage Area H55*b*5 (FIG. 1350) (S5). Host H then retrieves the caller"s calculated GPS data from Caller's Calculated GPS Data Storage Area H55*b*5 (FIG. 1350) (S6), and sends the data to Caller's Device (S7). Upon receiving the caller"s calculated GPS data from Host H (S8), CPU 211 stores the data in Caller's Calculated GPS Data Storage Area **20655*b*5 (FIG. 1334) (S9**). Here, the GPS raw data are the primitive data utilized to produce the caller"s calculated GPS data, and the caller"s calculated GPS data is the data representing the location of Caller"s Device in (x, y, z) format. The sequence described in the present drawing is repeated periodically.

FIG. 1355 illustrates another embodiment of the sequence described in FIG. 1354 in which the entire process is performed solely by Caller's Device Pin-pointing Software **20655*c*3 stored in Caller's Information Displaying Software Storage Area 20655*c* (FIG. 1339) of Caller's Device. Referring to the present drawing, CPU 211 (FIG. 1) of Caller's Device collects the raw GPS data from the near base stations (S1). CPU 211 then produces the caller"s calculated GPS data by referring to the raw GPS data (S2), and stores the caller"s calculated GPS data in Caller's Calculated GPS Data Storage Area 20655*b*5 (FIG. 1334) (S3**). The sequence described in the present drawing is repeated periodically.

FIG. 1356 illustrates Map Data Sending/Receiving Software H55*c*4 stored in Caller/Callee Software Storage Area H55*c* (FIG. 1351) of Host H (FIG. 429) and Map Data Sending/Receiving Software **20655*c*4 stored in Caller's Information Displaying Software Storage Area 20655*c* (FIG. 1339) of Caller's Device, which sends and receives the map data. Referring to the present drawing, CPU 211 (FIG. 1) of Caller's Device retrieves the caller"s calculated GPS data from Caller's Calculated GPS Data Storage Area 20655*b*5 (FIG. 1334) (S1), and sends the data to Host H (S2). Upon receiving the calculated GPS data from Caller's Device (S3**), Host H identifies the map data in Map Data Storage Area H55*b*3 (FIG. 1350) (S4). Here, the map data represents the surrounding area of the location indicated by the caller's calculated GPS data. Host H retrieves the map data from Map Data Storage Area H55*b*3 (FIG. 1350) (S5), and sends the data to Caller's Device (S6). Upon receiving the map data from Host H (S7), Caller's Device stores the data in Caller's Map Data Storage Area **20655*b*7 (FIG. 1334) (S8**). The sequence described in the present drawing is repeated periodically.

FIG. 1357 illustrates Caller's Audiovisual Data Collecting Software **20655*c*5 stored in Caller's Information Displaying Software Storage Area 20655*c* (FIG. 1339) of Caller's Device, which collects the audiovisual data of the caller to be sent to Callee's Device via Antenna 218 (FIG. 1) thereof. CPU 211 (FIG. 1) of Caller's Device retrieves the caller's audiovisual data from CCD Unit 214 and Microphone 215 (S1). CPU 211 then stores the caller's audio data in Caller's Audio Data Storage Area 20655*b*1*a* (FIG. 1335) (S2), and the caller's visual data in Caller's Visual Data Storage Area 20655*b*1*b* (FIG. 1335) (S3**). The sequence described in the present drawing is repeated periodically.

FIG. 1358 illustrates Caller's Information Sending/Receiving Software H55*c*6 stored in Caller/Callee Software Storage Area H55*c* (FIG. 1351) of Host H (FIG. 429) and Caller's Information Sending/Receiving Software **20655*c*6 stored in Caller's Information Displaying Software Storage Area 20655*c* (FIG. 1339) of Caller's Device, which sends and receives the Caller"s Information (which is defined hereinafter) between Caller's Device and Host H. Referring to the present drawing, CPU 211 (FIG. 1) of Caller's Device retrieves the permitted caller's personal data from Caller's Personal Data Storage Area 20655*b*3 (FIG. 1337) (S1). CPU 211 retrieves the caller"s calculated GPS data from Caller's Calculated GPS Data Storage Area 20655*b*5 (FIG. 1334) (S2). CPU 211 retrieves the map data from Caller's Map Data Storage Area 20655*b*7 (FIG. 1334) (S3). CPU 211 retrieves the caller's audio data from Caller's Audio Data Storage Area 20655*b*1*a* (FIG. 1335) (S4). CPU 211 retrieves the caller's visual data from Caller's Visual Data Storage Area 20655*b*1*b* (FIG. 1335) (S5). CPU 211 then sends the data retrieved in S1 through S5 (collectively defined as the 'Caller's Information' hereinafter) to Host H (S6). Upon receiving the Caller"s Information from Caller's Device (S7), Host H stores the Caller"s Information in Caller's Information Storage Area H55*b*1 (FIG. 1350) (S8**). The sequence described in the present drawing is repeated periodically.

FIG. 1359 illustrates Caller's Information Sending/Receiving Software H**55*c*6 stored in Caller/Callee Software Storage Area H55*c* (FIG. 1351) of Host H (FIG. 429) and Caller's Information Sending/Receiving Software 20655*c*6*a*A (FIG. 1347) stored in Caller's Information Displaying Software Storage Area 20655*c* (FIG. 1339) of Caller's Device, which sends and receives the Caller"s Information between Host H and Callee's Device. Referring to the present drawing, Host H retrieves the Caller"s Information from Caller's Information Storage Area H55*b*1 (FIG. 1350) (S1), and sends the Caller"s Information to Callee's Device (S2). CPU 211 (FIG. 1) of Callee's Device receives the Caller"s Information from Host H (S3). CPU 211 stores the permitted caller's personal data in Caller's Personal Data Storage Area 20655*b*3A (FIG. 1345) (S4). CPU 211 stores the caller"s calculated GPS data in Caller's Calculated GPS Data Storage Area 20655*b*5A (FIG. 1342) (S5). CPU 211 stores the map data in Caller's Map Data Storage Area 20655*b*7A (FIG. 1342) (S6). CPU 211 stores the caller's audio data in Caller's Audio Data Storage Area 20655*b*1*a*A (FIG. 1343) (S7). CPU 211 stores the caller's visual data in Caller's Visual Data Storage Area 20655*b*1*b*A (FIG. 1343) (S8**). The sequence described in the present drawing is repeated periodically.

FIG. 1360 illustrates Permitted Caller's Personal Data Displaying Software **20655*c*7A stored in Callee's Information Displaying Software Storage Area 20655*c*A (FIG. 1347) of Callee's Device, which displays the permitted caller's personal data on LCD 201 (FIG. 1) of Callee's Device. Referring to the present drawing, CPU 211 (FIG. 1) of Callee's Device retrieves the permitted caller's personal data from Caller's Personal Data Storage Area 20655*b*3A (FIG. 1345) (S1). CPU 211 then displays the permitted caller's personal data on LCD 201 (FIG. 1) (S2**). The sequence described in the present drawing is repeated periodically.

FIG. 1361 illustrates Map Displaying Software **20655*c*8A stored in Callee's Information Displaying Software Storage Area 20655*c*A (FIG. 1347) of Callee's Device, which displays the map representing the surrounding area of the location indicated by the caller's calculated GPS data. Referring to the present drawing, CPU 211 (FIG. 1) of Callee's Device retrieves the caller"s calculated GPS data from Caller's Calculated GPS Data Storage Area 20655*b*5A (FIG. 1342) (S1). CPU 211 then retrieves the map data from Caller's Map Data Storage Area 20655*b*7A (FIG. 1342) (S2), and arranges on the map data the caller's current location icon in accordance with the caller"s calculated GPS data (S3). Here, the caller's current location icon is an icon which represents the location of Caller's Device in the map data. The map with the caller's current location icon is displayed on LCD 201 (FIG. 1) (S4**). The sequence described in the present drawing is repeated periodically.

FIG. 1362 illustrates Caller's Audio Data Outputting Software **20655*c*9A stored in Caller's Information Displaying Software Storage Area 20655*c* (FIG. 1339) of Caller's Device, which outputs the caller's audio data from Speaker 216 (FIG. 1) of Callee's Device. Referring to the present drawing, CPU 211 (FIG. 1) of Callee's Device retrieves the caller's audio data from Caller's Audio Data Storage Area 20655*b*1*a*A (FIG. 1343) (S1). CPU 211 then outputs the caller's audio data from Speaker 216 (FIG. 1) (S2**). The sequence described in the present drawing is repeated periodically.

FIG. 1363 illustrates Caller's Visual Data Displaying Software **20655*c*10A stored in Callee's Information Displaying Software Storage Area 20655*c*A (FIG. 1347) of Callee's Device, which displays the caller's visual data on LCD 201 (FIG. 1) of Callee's Device. Referring to the present drawing, CPU 211 (FIG. 1) of Callee's Device retrieves the caller's visual data from Caller's Visual Data Storage Area 20655*b*1*b*A (FIG. 1343) (S1). CPU 211 then displays the caller's visual data on LCD 201 (FIG. 1) (S2**). The sequence described in the present drawing is repeated periodically.

FIGS. 1364 through 1375 primarily illustrate the sequence to output the Callee"s Information (which is defined hereinafter) from Caller's Device.

FIG. 1364 illustrates Permitted Callee's Personal Data Selecting Software **20655*c*1A stored in Callee's Information Displaying Software Storage Area 20655*c*A (FIG. 1347) of Callee's Device, which selects the permitted callee's personal data to be displayed on LCD 201 (FIG. 1) of Caller's Device. Referring to the present drawing, CPU 211 (FIG. 1) of Callee's Device retrieves all of the callee's personal data from Callee's Personal Data Storage Area 20655*b*4A (FIG. 1346) (S1). CPU 211 then displays a list of callee's personal data on LCD 201 (FIG. 1) (S2). The callee selects, by utilizing Input Device 210 (FIG. 1) or via voice recognition system, the callee's personal data permitted to be displayed on Caller's Device (S3). The permitted callee's personal data flag of the data selected in S3 is registered as '1' (S4**).

FIG. 1365 illustrates Dialing Software H**55*c*2 stored in Caller/Callee Software Storage Area H55*c* (FIG. 1351) of Host H (FIG. 429), Dialing Software 20655*c*2A stored in Callee's Information Displaying Software Storage Area 20655*c*A (FIG. 1347) of Callee's Device, and Dialing Software 20655*c*2 stored in Caller's Information Displaying Software Storage Area 20655*c* (FIG. 1339) of Caller's Device, which enables to connect between Callee's Device and Caller's Device via Host H (FIG. 429) in a wireless fashion. Referring to the present drawing, a connection is established between Callee's Device and Host H (S1). Next, a connection is established between Host H and Caller's Device (S2). As a result, Callee's Device and Caller's Device are able to exchange audiovisual data, text data, and various types of data with each other. The sequence described in the present drawing is not necessarily implemented if the connection between Caller"s Device and Callee"s Device is established as described in FIG. 1353**. The sequence described in the present drawing may be implemented if the connection is accidentally terminated by Callee"s Device and the connection process is initiated by Callee"s Device.

FIG. 1366 illustrates Callee's Device Pin-pointing Software H**55*c*3*a* stored in Caller/Callee Software Storage Area H55*c* (FIG. 1351) of Host H (FIG. 429) and Callee's Device Pin-pointing Software 20655*c*3A stored in Callee's Information Displaying Software Storage Area 20655*c*A of Callee's Device, which identifies the current geographic location of Callee's Device. Referring to the present drawing, CPU 211 (FIG. 1) of Callee's Device collects the GPS raw data from the near base stations (S1). CPU 211 sends the raw GPS data to Host H (S2). Upon receiving the raw GPS data (S3), Host H produces the callee"s calculated GPS data by referring to the raw GPS data (S4). Host H stores the callee"s calculated GPS data in Callee's Calculated GPS Data Storage Area H55*b*6 (FIG. 1350) (S5). Host H then retrieves the callee"s calculated GPS data from Callee's Calculated GPS Data Storage Area H55*b*6 (FIG. 1350) (S6), and sends the data to Callee's Device (S7). Upon receiving the callee"s calculated GPS data from Host H (S8), CPU 211 stores the data in Callee's Calculated GPS Data Storage Area 20655*b*6A (FIG. 1342) (S9**). Here, the GPS raw data are the primitive data utilized to produce the callee"s calculated GPS data, and the callee"s calculated GPS data is the data representing the location of Callee"s Device in (x, y, z) format. The sequence described in the present drawing is repeated periodically.

FIG. 1367 illustrates another embodiment of the sequence described in FIG. 1366 in which the entire process is performed solely by Callee's Device Pin-pointing Software 20655*c*3A stored in Callee's Information Displaying Software Storage Area 20655*c*A (FIG. 1347) of Callee's Device. Referring to the present drawing, CPU 211 (FIG. 1) of Callee's Device collects the raw GPS data from the near base stations (S1). CPU 211 then produces the callee"s calculated GPS data by referring to the raw GPS data (S2), and stores the callee"s calculated GPS data in Callee's Calculated GPS Data Storage Area 20655*b*6A (FIG. 1342) (S3). The sequence described in the present drawing is repeated periodically.

FIG. 1368 illustrates Map Data Sending/Receiving Software H55*c*4 stored in Caller/Callee Software Storage Area H55*c* (FIG. 1351) of Host H (FIG. 429) and Map Data Sending/Receiving Software 20655*c*4A stored in Callee's Information Displaying Software Storage Area 20655*c*A (FIG. 1347) of Callee's Device, which sends and receives the map data. Referring to the present drawing, CPU 211 (FIG. 1) of Callee's Device retrieves the callee"s calculated GPS data from Callee's Calculated GPS Data Storage Area 20655*b*6A (FIG. 1342) (S1), and sends the data to Host H (S2). Upon receiving the calculated GPS data from Callee's Device (S3), Host H identifies the map data in Map Data Storage Area H55*b*3 (FIG. 1350) (S4). Here, the map data represents the surrounding area of the location indicated by the callee's calculated GPS data. Host H retrieves the map data from Map Data Storage Area H55*b*3 (FIG. 1350) (S5), and sends the data to Callee's Device (S6). Upon receiving the map data from Host H (S7), Callee's Device stores the data in Callee's Map Data Storage Area 20655*b*8A (FIG. 1342) (S8). The sequence described in the present drawing is repeated periodically.

FIG. 1369 illustrates Callee's Audiovisual Data Collecting Software 20655*c*5A stored in Callee's Information Displaying Software Storage Area 20655*c*A (FIG. 1347) of Callee's Device, which collects the audiovisual data of the callee to be sent to Caller's Device via Antenna 218 (FIG. 1) thereof. CPU 211 (FIG. 1) of Callee's Device retrieves the callee's audiovisual data from CCD Unit 214 and Microphone 215 (S1). CPU 211 then stores the callee's audio data in Callee's Audio Data Storage Area 20655*b*2*a*A (FIG. 1344) (S2), and the callee's visual data in Callee's Visual Data Storage Area 20655*b*2*b*A (FIG. 1344) (S3). The sequence described in the present drawing is repeated periodically.

FIG. 1370 illustrates Callee's Information Sending/Receiving Software H55*c*6*a* (FIG. 1351) stored in Caller/Callee Software Storage Area H55*c* (FIG. 1351) of Host H (FIG. 429) and Callee's Information Sending/Receiving Software 20655*c*6A (FIG. 1347) stored in Callee's Information Displaying Software Storage Area 20655*c*A of Callee's Device, which sends and receives the Callee"s Information (which is defined hereinafter) between Callee's Device and Host H. Referring to the present drawing, CPU 211 (FIG. 1) of Callee's Device retrieves the permitted callee's personal data from Callee's Personal Data Storage Area 20655*b*4A (FIG. 1346) (S1). CPU 211 retrieves the callee"s calculated GPS data from Callee's Calculated GPS Data Storage Area 20655*b*6A (FIG. 1342) (S2). CPU 211 retrieves the map data from Callee's Map Data Storage Area 20655*b*8A (FIG. 1342) (S3). CPU 211 retrieves the callee's audio data from Callee's Audio Data Storage Area 20655*b*2*a*A (FIG. 1344) (S4). CPU 211 retrieves the callee's visual data from Callee's Visual Data Storage Area 20655*b*2*b*A (FIG. 1344) (S5). CPU 211 then sends the data retrieved in S1 through S5 (collectively defined as the 'Callee's Information' hereinafter) to Host H (S6). Upon receiving the Callee"s Information from Callee's Device (S7), Host H stores the Callee"s Information in Callee's Information Storage Area H55*b*2 (FIG. 1350) (S8). The sequence described in the present drawing is repeated periodically.

FIG. 1371 illustrates Callee's Information Sending/Receiving Software H55*c*6*a* stored in Caller/Callee Software Storage Area H55*c* (FIG. 1351) of Host H (FIG. 429) and Callee's Information Sending/Receiving Software 20655*c*6*a* stored in Caller's Information Displaying Software Storage Area 20655*c* (FIG. 1339) of Caller's Device, which sends and receives the Callee"s Information between Host H and Caller's Device. Referring to the present drawing, Host H retrieves the Callee"s Information from Callee's Information Storage Area H55*b*2 (FIG. 1350) (S1), and sends the Callee"s Information to Caller's Device (S2). CPU 211 (FIG. 1) of Caller's Device receives the Callee"s Information from Host H (S3). CPU 211 stores the permitted callee's personal data in Callee's Personal Data Storage Area 20655*b*4 (FIG. 1338) (S4). CPU 211 stores the callee"s calculated GPS data in Callee's Calculated GPS Data Storage Area 20655*b*6 (FIG. 1334) (S5). CPU 211 stores the map data in Callee's Map Data Storage Area 20655*b*8 (FIG. 1334) (S6). CPU 211 stores the callee's audio data in Callee's Audio Data Storage Area 20655*b*2*a* (FIG. 1336) (S7). CPU 211 stores the callee's visual data in Callee's Visual Data Storage Area 20655*b*2*b* (FIG. 1336) (S8). The sequence described in the present drawing is repeated periodically.

FIG. 1372 illustrates Permitted Callee's Personal Data Displaying Software 20655*c*7 stored in Caller's Information Displaying Software Storage Area 20655*c* (FIG. 1339) of Caller's Device, which displays the permitted callee's personal data on LCD 201 (FIG. 1) of Caller's Device. Referring to the present drawing, CPU 211 (FIG. 1) of Caller's Device retrieves the permitted callee's personal data from Callee's Personal Data Storage Area 20655*b*4 (FIG. 1338) (S1). CPU 211 then displays the permitted callee's personal data on LCD 201 (FIG. 1) (S2). The sequence described in the present drawing is repeated periodically.

FIG. 1373 illustrates Map Displaying Software 20655*c*8 stored in Caller's Information Displaying Software Storage Area 20655*c* (FIG. 1339) of Caller's Device, which displays the map representing the surrounding area of the location indicated by the callee's calculated GPS data. Referring to the present drawing, CPU 211 (FIG. 1) of Caller's Device retrieves the callee"s calculated GPS data from Callee's Calculated GPS Data Storage Area 20655*b*6 (FIG. 1334) (S1). CPU 211 then retrieves the map data from Callee's Map Data Storage Area 20655*b*8 (FIG. 1334) (S2), and arranges on the map data the callee's current location icon in accordance with the callee"s calculated GPS data (S3). Here, the callee's current location icon is an icon which represents the location of Callee's Device in the map data. The map with the callee's current location icon is displayed on LCD 201 (FIG. 1) (S4). The sequence described in the present drawing is repeated periodically.

FIG. 1374 illustrates Callee's Audio Data Outputting Software **20655*c*9 stored in Caller's Information Displaying Software Storage Area 20655*c* (FIG. 1339) of Caller's Device, which outputs the callee's audio data from Speaker 216 (FIG. 1) of Caller's Device. Referring to the present drawing, CPU 211 (FIG. 1) of Caller's Device retrieves the callee's audio data from Callee's Audio Data Storage Area 20655*b*2*a* (FIG. 1336) (S1). CPU 211 then outputs the caller's audio data from Speaker 216 (FIG. 1) (S2**). The sequence described in the present drawing is repeated periodically.

FIG. 1375 illustrates Callee's Visual Data Displaying Software **20655*c*10 stored in Caller's Information Displaying Software Storage Area 20655*c* (FIG. 1339) of Caller's Device, which displays the callee's visual data on LCD 201 (FIG. 1) of Caller's Device. Referring to the present drawing, CPU 211 (FIG. 1) of Caller's Device retrieves the callee's visual data from Callee's Visual Data Storage Area 20655*b*2*b* (FIG. 1336) (S1). CPU 211 then displays the callee's visual data on LCD 201 (FIG. 1) (S2**). The sequence described in the present drawing is repeated periodically.

<<Caller's Information Displaying Function—Summary>>

(1) A communication device comprising a microphone, a speaker, a display, an input device and a multiple mode implementer, wherein said multiple mode implementer implements a voice communication mode and a caller"s information displaying mode, a series of audio data are input to and output from said microphone and said speaker respectively when said voice communication mode is implemented, a series of visual data and a set of personal data of the opponent party are displayed on said display when caller"s information displaying mode is implemented.

(2) A caller"s information displaying software program wherein a series of visual data and a set of personal data of the opponent party are displayed on a display of a communication device, and a series of audio data of the opponent party are output from a speaker of said communication device under the control of said caller"s information displaying software program.

(3) A host computer storing a caller"s information displaying software program wherein a series of visual data and a set of personal data of the opponent party are displayed on a display of a communication device, and a series of audio data of the opponent party are output from a speaker of said communication device under the control of said caller"s information displaying software program.

<<Communication Device Remote Controlling Function (by Phone)>>

FIGS. 1394 through 1415 illustrate the communication device remote controlling function (by phone) which enables the user of Communication Device 200 to remotely control Communication Device 200 via conventional telephone Phone PH (not shown in the drawings).

FIG. 1394 illustrates the storage areas included in Host H (FIG. 429). As described in the present drawing, Host H includes Communication Device Controlling Information Storage Area H**57*a* of which the data and the software programs stored therein are described in FIG. 1395**.

FIG. 1395 illustrates the storage areas included in Communication Device Controlling Information Storage Area H**57*a* (FIG. 1394). As described in the present drawing, Communication Device Controlling Information Storage Area H57*a* includes Communication Device Controlling Data Storage Area H57*b* and Communication Device Controlling Software Storage Area H57*c*. Communication Device Controlling Data Storage Area H57*b* stores the data necessary to implement the present function on the side of Host H (FIG. 429), such as the ones described in FIGS. 1396 through 1399. Communication Device Controlling Software Storage Area H57*c* stores the software programs necessary to implement the present function on the side of Host H, such as the ones described in FIG. 1400**.

FIG. 1396 illustrates the storage areas included in Communication Device Controlling Data Storage Area H**57*b* (FIG. 1395). As described in the present drawing, Communication Device Controlling Data Storage Area H57*b* includes Password Data Storage Area H57*b*1, Phone Number Data Storage Area H57*b*2, Audio Data Storage Area H57*b*3, and Work Area H57*b*4. Password Data Storage Area H57*b*1 stores the data described in FIG. 1397. Phone Number Data Storage Area H57*b*2 stores the data described in FIG. 1398. Audio Data Storage Area H57*b*3 stores the data described in FIG. 1399. Work Area H57*b*4** is utilized as a work area to perform calculation and to temporarily store data.

FIG. 1397 illustrates the data stored in Password Data Storage Area H**57*b*1 (FIG. 1396). As described in the present drawing, Password Data Storage Area H57*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the example described in the present drawing, Password Data Storage Area H57*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5**'.

FIG. 1398 illustrates the data stored in Phone Number Data Storage Area H**57*b*2 (FIG. 1396). As described in the present drawing, Phone Number Data Storage Area H57*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the example described in the present drawing, Phone Number Data Storage Area H57*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5**'.

FIG. 1399 illustrates the data stored in Audio Data Storage Area H**57*b*3 (FIG. 1396). As described in the present drawing, Audio Data Storage Area H57*b*3** comprises two columns, i.e., 'Audio ID' and 'Audio Data'. Column 'Audio ID' stores the audio IDs, and each audio ID represents the identification of the audio data stored in column 'Audio Data'. Column 'Audio Data' stores the audio data, and each audio data represents a message output from a conventional telephone Phone PH. In the example described in the present drawing, Audio Data Storage Area H57*b*3 stores the following data: the audio ID 'Audio#0' and the corresponding audio data 'Audio Data#0'; the audio ID 'Audio#1' and the corresponding audio data 'Audio Data#1'; the audio ID 'Audio#2' and the corresponding audio data 'Audio Data#2'; the audio ID 'Audio#3' and the corresponding audio data 'Audio Data#3'; the audio ID 'Audio#4' and the corresponding audio data 'Audio Data#4'; the audio ID 'Audio#5' and the corresponding audio data 'Audio Data#5'; and the audio ID 'Audio#6' and the corresponding audio data 'Audio Data#6'. 'Audio Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Audio Data#1' represents the message: 'The manner mode has been deactivated.' 'Audio Data#2' represents the message: 'The manner mode has been deactivated and your mobile phone has been rung.' 'Audio Data#3'represents the message: 'Your mobile phone has been rung.' 'Audio Data#4' represents the message: 'The password of your mobile phone has been changed.' 'Audio Data#5' represents the message: 'Your mobile phone has been changed.' 'Audio Data#6' represents the message: 'Your mobile phone has been power-offed.' The foregoing audio data may be recorded in either male's voice or female's voice.

FIG. 1400 illustrates the software programs stored in Communication Device Controlling Software Storage Area H57*c* (FIG. 1395). As described in the present drawing, Communication Device Controlling Software Storage Area H57*c* stores User Authenticating Software H57*c*1, Menu Introducing Software H57*c*2, Line Connecting Software H57*c*3, Manner Mode Deactivating Software H57*c*4, Manner Mode Deactivating & Ringing Software H57*c*5, Ringing Software H57*c*6, Password Changing Software H57*c*7, Device Locking Software H57*c*8, and Power Off Software H57*c*9. User Authenticating Software H57*c*1 is the software program described in FIG. 1407. Menu Introducing Software H57*c*2 is the software program described in FIG. 1408. Line Connecting Software H57*c*3 is the software program described in FIG. 1409. Manner Mode Deactivating Software H57*c*4 is the software program described in FIG. 1410. Manner Mode Deactivating & Ringing Software H57*c*5 is the software program described in FIG. 1411. Ringing Software H57*c*6 is the software program described in FIG. 1412. Password Changing Software H57*c*7 is the software program described in FIG. 1413. Device Locking Software H57*c*8 is the software program described in FIG. 1414. Power Off Software H57*c*9 is the software program described in FIG. 1415.

FIG. 1401 illustrates the storage area included in RAM 206 (FIG. 1). As described in the present drawing, RAM 206 includes Communication Device Controlling Information Storage Area 20657*a* of which the data and the software programs stored therein are described in FIG. 1402.

FIG. 1402 illustrates the storage areas included in Communication Device Controlling Information Storage Area 20657*a* (FIG. 1401). As described in the present drawing, Communication Device Controlling Information Storage Area 20657*a* includes Communication Device Controlling Data Storage Area 20657*b* and Communication Device Controlling Software Storage Area 20657*c*. Communication Device Controlling Data Storage Area 20657*b* stores the data necessary to implement the present function on the side of Communication Device 200, such as the ones described in FIGS. 1403 through 1405. Communication Device Controlling Software Storage Area 20657*c* stores the software programs necessary to implement the present function on the side of Communication Device 200, such as the ones described in FIG. 1406.

The data and software programs stored in Communication Device Controlling Information Storage Area 20657*a* (FIG. 1402) are downloaded from Host H (FIG. 429) in the manner described in FIGS. 401 through 407.

FIG. 1403 illustrates the storage areas included in Communication Device Controlling Data Storage Area 20657*b* (FIG. 1402). As described in the present drawing, Communication Device Controlling Data Storage Area 20657*b* includes Password Data Storage Area 20657*b*1 and Work Area 20657*b*4. Password Data Storage Area 20657*b*1 stores the data described in FIG. 1404. Work Area 20657*b*4 is utilized as a work area to perform calculation and to temporarily store data.

FIG. 1404 illustrates the data stored in Password Data Storage Area 20657*b*1 (FIG. 1403). As described in the present drawing, Password Data Storage Area 20657*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the example described in the present drawing, Password Data Storage Area H57*b*1 stores the following data: the user ID 'User#1' and the corresponding password data 'Password Data#1'.

FIG. 1405 illustrates the data stored in Phone Number Data Storage Area 20657*b*2 (FIG. 1403). As described in the present drawing, Phone Number Data Storage Area 20657*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the example described in the present drawing, Phone Number Data Storage Area H57*b*2 stores the following data: the user ID 'User#1' and the corresponding phone number data 'Phone Number Data#1'.

FIG. 1406 illustrates the software programs stored in Communication Device Controlling Software Storage Area 20657*c* (FIG. 1402). As described in the present drawing, Communication Device Controlling Software Storage Area 20657*c* stores Line Connecting Software 20657*c*3, Manner Mode Deactivating Software 20657*c*4, Manner Mode Deactivating & Ringing Software 20657*c*5, Ringing Software 20657*c*6, Password Changing Software 20657*c*7, Device Locking Software 20657*c*8, and Power Off Software 20657*c*9. Line Connecting Software 20657*c*3 is the software program described in FIG. 1409. Manner Mode Deactivating Software 20657*c*4 is the software program described in FIG. 1410. Manner Mode Deactivating & Ringing Software 20657*c*5 is the software program described in FIG. 1411. Ringing Software 20657*c*6 is the software program described in FIG. 1412. Password Changing Software 20657*c*7 is the software program described in FIG. 1413. Device Locking Software 20657*c*8 is the software program described in FIG. 1414. Power Off Software 20657*c*9 is the software program described in FIG. 1415.

FIGS. 1407 through 1415 illustrate the software programs which enables the user of Communication Device 200 to remotely control Communication Device 200 via conventional telephone Phone PH.

FIG. 1407 illustrates User Authenticating Software H57*c*1 (FIG. 1400) stored in Communication Device Controlling Software Storage Area H57*c* of Host H (FIG. 429), which authenticates the user of Communication Device 200 to implement the present function via Phone PH. As described in the present drawing, Phone PH calls Host H by dialing the predetermined phone number of Host H (S1). Upon receiving the call from Phone PH (S2) and the line is connected therebetween (S3), the user, by utilizing Phone PH, inputs both his/her password data (S4) and the phone number data of Communication Device 200 (S5). Host H initiates the authentication process by referring to Password Data Storage Area H57*b*1 (FIG. 1397) and Phone Number Data Storage Area H57*b*2 (FIG. 1398)) (S6). The authentication process is completed (and the sequences described hereafter are enabled thereafter) if the password data and the phone number data described in S4 and S5 match with the data stored in Password Data Storage Area H57*b*1 and Phone Number Data Storage Area H57*b*2.

FIG. 1408 illustrates Menu Introducing Software H57*c*2 (FIG. 1400) stored in Communication Device Controlling Software Storage Area H57*c* of Host H (FIG. 429), which introduces the menu via Phone PH. As described in the present drawing, Host H retrieves Audio Data#0 from Audio Data Storage Area H57*b*3 (FIG. 1399) (S1), and sends the data to Phone PH (S2). Upon receiving Audio Data#0 from Host H (S3), Phone PH outputs Audio Data#0 from its speaker (S4). The user presses one of the keys of '1' through '6' wherein the sequences implemented thereafter are described in FIGS. 1409 through 1415 (S5).

FIG. 1409 illustrates Line Connecting Software H57*c*3 (FIG. 1400) stored in Communication Device Controlling Software Storage Area H57*c* of Host H (FIG. 429) and Line Connecting Software 20657*c*3 (FIG. 1406) stored in Communication Device Controlling Software Storage Area 20657*c* of Communication Device 200, which connect line between Host H and Communication Device 200. As described in the present drawing, Host H calls Communication Device 200 by retrieving the corresponding phone number data from Phone Number Data Storage Area H57*b*2 (FIG. 1398) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

FIG. 1410 illustrates Manner Mode Deactivating Software H57*c*4 (FIG. 1400) stored in Communication Device Controlling Software Storage Area H57*c* of Host H (FIG. 429) and Manner Mode Deactivating Software 20657*c*4 (FIG. 1406) stored in Communication Device Controlling Software Storage Area 20657*c* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user presses key '1' of Phone PH (S1). In response, Phone PH sends the corresponding signal to Host H (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Audio Data#1 from Audio Data Storage Area H57*b*3 (FIG. 1399) and sends the data to Phone PH (S6). Upon receiving Audio Data#1 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57*c*5 and Manner Mode Deactivating & Ringing Software 20657*c*5 is merely to let the user to identify the location of Communication Device 200. Therefore, a voice communication between human beings is not enabled thereafter.

FIG. 1411 illustrates Manner Mode Deactivating & Ringing Software H57*c*5 (FIG. 1400) stored in Communication Device Controlling Software Storage Area H57*c* of Host H (FIG. 429) and Manner Mode Deactivating & Ringing Software 20657*c*5 (FIG. 1406) stored in Communication Device Controlling Software Storage Area 20657*c* of Communication Device 200, which deactivate the manner mode of Communication Device 200 and outputs a ringing sound thereafter. Assume that the user presses key '2' of Phone PH (S1). In response, Phone PH sends the corresponding signal to Host H (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Audio Data#2 from Audio Data Storage Area H57*b*3 (FIG. 1399) and sends the data to Phone PH (S7). Upon receiving Audio Data#2 from Host H, Phone PH outputs the data from its speaker (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H57*c*5 and Manner Mode Deactivating & Ringing Software 20657*c*5 is merely to let the user to identify the location of Communication Device 200. Therefore, a voice communication between human beings is not enabled thereafter by implementing the present function.

FIG. 1412 illustrates Ringing Software H57*c*6 (FIG. 1400) stored in Communication Device Controlling Software Storage Area H57*c* of Host H (FIG. 429) and Ringing Software 20657*c*6 (FIG. 1406) stored in Communication Device Controlling Software Storage Area 20657*c* of Communication Device 200, which output a ringing sound from Speaker 216 (FIG. 1). Assume that the user presses key '3' of Phone PH (S1). In response, Phone PH sends the corresponding signal to Host H (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Audio Data#3 from Audio Data Storage Area H57*b*3 (FIG. 1399) and sends the data to Phone PH (S6). Upon receiving Audio Data#3 from Host H, Phone PH outputs the data from its speaker (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H57*c*6 and Ringing Software 20657*c*6 is merely to let the user to identify the location of Communication Device 200. Therefore, a voice communication between human beings is not enabled thereafter by implementing the present function.

FIG. 1413 illustrates Password Changing Software H57*c*7 (FIG. 1400) stored in Communication Device Controlling Software Storage Area H57*c* of Host H (FIG. 429) and Password Changing Software 20657*c*7 (FIG. 1406) stored in Communication Device Controlling Software Storage Area 20657*c* of Communication Device 200, which change the password necessary to operate Communication Device 200. Assume that the user presses key '4' of Phone PH (S1). In response, Phone PH sends the corresponding signal to Host H (S2). The user then enters a new password data by utilizing Phone PH (S3), which is sent to Communication Device 200 by Host H (S4). Upon receiving the new password data from Host H (S5), Communication Device 200 stores the new password data in Password Data Storage Area 20657*b*1 (FIG. 1404) and the old password data is erased (S6). Host H retrieves Audio Data#4 from Audio Data Storage Area H57*b*3 (FIG. 1399) and sends the data to Phone PH (S7). Upon receiving Audio Data#4 from Host H, Phone PH outputs the data from its speaker (S8).

FIG. 1414 illustrates Device Locking Software H57*c*8 (FIG. 1400) stored in Communication Device Controlling Software Storage Area H57*c* of Host H (FIG. 429) and Device Locking Software 20657*c*8 (FIG. 1406) stored in Communication Device Controlling Software Storage Area 20657*c* of Communication Device 200, which lock Communication Device 200, i.e., nullify any input signal input via Input Device 210 (FIG. 1). Assume that the user presses key '5' of Phone PH (S1). In response, Phone PH sends the corresponding signal to Host H (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20657*b*1 (FIG. 1404) is entered (S5). Host H retrieves Audio Data#5 from Audio Data Storage Area H57*b*3 (FIG. 1399) and sends the data to Phone PH (S6). Upon receiving Audio Data#5 from Host H, Phone PH outputs the data from its speaker (S7).

FIG. 1415 illustrates Power Off Software H57*c*9 (FIG. 1400) stored in Communication Device Controlling Software Storage Area H57*c* of Host H (FIG. 429) and Power Off Software 20657*c*9 (FIG. 1406) stored in Communication Device Controlling Software Storage Area 20657*c* of Communication Device 200, which turn off the power of Communication Device 200. Assume that the user presses key '6' of Phone PH (S1). In response, Phone PH sends the corresponding signal to Host H (S2). Host H, upon receiving the signal described in S2, sends a power off command to Communication Device 200 (S3). Upon receiving the power off command from Host H (S4), Communication Device 200 turns off the power of itself (S5). Host H retrieves Audio Data#6 from Audio Data Storage Area H57*b*3 (FIG. 1399) and sends the data to Phone PH (S6). Upon receiving Audio Data#6 from Host H, Phone PH outputs the data from its speaker (S7).

<<Communication Device Remote Controlling Function (by Phone)—Summary>>

(1) A host computer connected to a conventional telephone wherein, in response to a specific telephone signal received from said conventional telephone, said host computer sends a specific command the corresponding to said specific telephone signal.

(2) A communication device remote controlling software program stored in a host computer and/or a communication device wherein, in response to a specific telephone signal received from a conventional telephone, said communication device remote controlling software program sends a specific command the corresponding to said specific telephone signal to said communication device, said communication device under the command of said communication device remote controlling software program implements a specific communication device action in accordance with said specific command.

(3) The host computer of summary (1) thereby enabling the user of said conventional telephone to remotely control his/her communication device.

(4) The host computer of summary (1), wherein said specific command is a manner mode deactivating command.

(5) The host computer of summary (1), wherein said specific command is a device ringing command.

(6) The host computer of summary (1), wherein said specific command is a password changing command.

(7) The host computer of summary (1), wherein said specific command is a device locking command.

(8) The host computer of summary (1), wherein said specific command is a power off command.

(9) The communication device remote controlling software program of summary (2) thereby enabling the user of said conventional telephone to remotely control his/her communication device.

(10) The communication device remote controlling software program of summary (2), wherein said specific command is a manner mode deactivating command.

(11) The communication device remote controlling software program of summary (2), wherein said specific command is a device ringing command.

(12) The communication device remote controlling software program of summary (2), wherein said specific command is a password changing command.

(13) The communication device remote controlling software program of summary (2), wherein said specific command is a device locking command.

(14) The communication device remote controlling software program of summary (2), wherein said specific command is a power off command.

<<Communication Device Remote Controlling Function (by Web)>>

FIGS. 1416 through 1437 illustrate the communication device remote controlling function (by web) which enables the user of Communication Device 200 to remotely control Communication Device 200 by an ordinary personal computer (Personal Computer PC) via the Internet, i.e., by accessing a certain web site. Here, Personal Computer PC may be any type of personal computer, including a desktop computer, lap top computer, and PDA.

FIG. 1416 illustrates the storage areas included in Host H (FIG. 429). As described in the present drawing, Host H includes Communication Device Controlling Information Storage Area H58*a* of which the data and the software programs stored therein are described in FIG. 1417.

FIG. 1417 illustrates the storage areas included in Communication Device Controlling Information Storage Area H58*a* (FIG. 1416). As described in the present drawing, Communication Device Controlling Information Storage Area H58*a* includes Communication Device Controlling Data Storage Area H58*b* and Communication Device Controlling Software Storage Area H58*c*. Communication Device Controlling Data Storage Area H58*b* stores the data necessary to implement the present function on the side of Host H (FIG. 429), such as the ones described in FIGS. 1418 through 1421. Communication Device Controlling Software Storage Area H58*c* stores the software programs necessary to implement the present function on the side of Host H, such as the ones described in FIG. 1422.

FIG. 1418 illustrates the storage areas included in Communication Device Controlling Data Storage Area H58*b* (FIG. 1417). As described in the present drawing, Communication Device Controlling Data Storage Area H58*b* includes Password Data Storage Area H58*b*1, Phone Number Data Storage Area H58*b*2, Web Display Data Storage Area H58*b*3, and Work Area H58*b*4. Password Data Storage Area H58*b*1 stores the data described in FIG. 1419. Phone Number Data Storage Area H58*b*2 stores the data described in FIG. 1420. Web Display Data Storage Area H58*b*3 stores the data described in FIG. 1421. Work Area H58*b*4 is utilized as a work area to perform calculation and to temporarily store data.

FIG. 1419 illustrates the data stored in Password Data Storage Area H58*b*1 (FIG. 1418). As described in the present drawing, Password Data Storage Area H58*b*1 comprises two columns, i.e., 'User ID' and 'Password Data'. Column 'User ID' stores the user IDs, and each user ID represents the identification of the user of Communication Device 200. Column 'Password Data' stores the password data, and each password data represents the password set by the user of the corresponding user ID. Here, each password data is composed of alphanumeric data. In the example described in the present drawing, Password Data Storage Area H58*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; the user ID 'User#4' and the corresponding password data 'Password Data#4'; and the user ID 'User#5' and the corresponding password data 'Password Data#5'.

FIG. 1420 illustrates the data stored in Phone Number Data Storage Area H58*b*2 (FIG. 1418). As described in the present drawing, Phone Number Data Storage Area H58*b*2 comprises two columns, i.e., 'User ID' and 'Phone Number Data'. Column 'User ID' stores the user IDs, and each user ID represents the identification of the user of Communication Device 200. Column 'Phone Number Data' stores the phone number data, and each phone number data represents the phone number of the user of the corresponding user ID. Here, each phone number data is composed of numeric data. In the example described in the present drawing, Phone Number Data Storage Area H58*b*2 stores the following data: the user ID 'User#1' and the corresponding phone number data 'Phone Number Data#1'; the user ID 'User#2' and the corresponding phone number data 'Phone Number Data#2'; the user ID 'User#3' and the corresponding phone number data 'Phone Number Data#3'; the user ID 'User#4' and the corresponding phone number data 'Phone Number Data#4'; and the user ID 'User#5' and the corresponding phone number data 'Phone Number Data#5'.

FIG. 1421 illustrates the data stored in Web Display Data Storage Area H58*b*3 (FIG. 1418). As described in the present drawing, Web Display Data Storage Area H58*b*3 comprises two columns, i.e., 'Web Display ID' and 'Web Display Data'. Column 'Web Display ID' stores the web display IDs, and each web display ID represents the identification of the web display data stored in column 'Web Display Data'. Column 'Web Display Data' stores the web display data, and each web display data represents a message displayed on Personal Computer PC. In the example described in the present drawing, Web Display Data Storage Area H58*b*3 stores the following data: the web display ID 'Web Display#0' and the corresponding web display data 'Web Display Data#0'; the web display ID 'Web Display#1' and the corresponding web display data 'Web Display Data#1'; the web display ID 'Web Display#2' and the corresponding web display data 'Web Display Data#2'; the web display ID 'Web Display#3' and the corresponding web display data 'Web Display Data#3'; the web display ID 'Web Display#4' and the corresponding web display data 'Web Display Data#4'; the web display ID 'Web Display#5' and the corresponding web display data 'Web Display Data#5'; and the web display ID 'Web Display#6' and the corresponding web display data 'Web Display Data#6'. 'Web Display Data#0' represents the message: 'To deactivate manner mode, press 1. To deactivate manner mode and ring your mobile phone, press 2. To ring your mobile phone, press 3. To change password of your mobile phone, press 4. To lock your mobile phone, press 5. To power off your mobile phone, press 6.' 'Web Display Data#1' represents the message: 'The manner mode has been deactivated.' 'Web Display Data#2' represents the message: 'The manner mode has been deactivated and your mobile phone has been rung.' 'Web Display Data#3' represents the message: 'Your mobile phone has been rung.' 'Web Display Data#4' represents the message: 'The password of your mobile phone has been changed.' 'Web Display Data#5' represents the message: 'Your mobile phone has been changed.' 'Web Display Data#6'represents the message: 'Your mobile phone has been power-offed.' FIG. 1421*a* illustrates the display of Personal Computer PC. Referring to the present drawing, Home Page 20158HP, i.e., a home page to implement the present function is displayed on Personal Computer PC. Home Page 20158HP is primarily composed of Web Display Data#0 (FIG. 1421) and six buttons, i.e., Buttons 1 through 6. Following the instruction described in Web Display Data#0, the user may select one of the buttons to implement the desired function as described hereinafter.

FIG. 1422 illustrates the software programs stored in Communication Device Controlling Software Storage Area H58*c* (FIG. 1417). As described in the present drawing, Communication Device Controlling Software Storage Area H58*c* stores User Authenticating Software H58*c*1, Menu Introducing Software H58*c*2, Line Connecting Software H58*c*3, Manner Mode Deactivating Software H58*c*4, Manner Mode Deactivating & Ringing Software H58*c*5, Ringing Software H58*c*6, Password Changing Software H58*c*7, Device Locking Software H58*c*8, and Power Off Software H58*c*9. User Authenticating Software H58*c*1 is the software program described in FIG. 1429. Menu Introducing Software H58*c*2 is the software program described in FIG. 1430. Line Connecting Software H58*c*3 is the software program described in FIG. 1431. Manner Mode Deactivating Software H58*c*4 is the software program described in FIG. 1432. Manner Mode Deactivating & Ringing Software H58*c*5 is the software program described in FIG. 1433. Ringing Software H58*c*6 is the software program described in FIG. 1434. Password Changing Software H58*c*7 is the software program described in FIG. 1435. Device Locking Software H58*c*8 is the software program described in FIG. 1436. Power Off Software H58*c*9 is the software program described in FIG. 1437.

FIG. 1423 illustrates the storage area included in RAM 206 (FIG. 1). As described in the present drawing, RAM 206 includes Communication Device Controlling Information Storage Area 20658*a* of which the data and the software programs stored therein are described in FIG. 1424.

FIG. 1424 illustrates the storage areas included in Communication Device Controlling Information Storage Area 20658*a* (FIG. 1423). As described in the present drawing, Communication Device Controlling Information Storage Area 20658*a* includes Communication Device Controlling Data Storage Area 20658*b* and Communication Device Controlling Software Storage Area 20658*c*. Communication Device Controlling Data Storage Area 20658*b* stores the data necessary to implement the present function on the side of Communication Device 200, such as the ones described in FIGS. 1425 through 1427. Communication Device Controlling Software Storage Area 20658*c* stores the software programs necessary to implement the present function on the side of Communication Device 200, such as the ones described in FIG. 1428.

The data and software programs stored in Communication Device Controlling Information Storage Area 20658*a* (FIG. 1424) are downloaded from Host H (FIG. 429) in the manner described in FIGS. 401 through 407.

FIG. 1425 illustrates the storage areas included in Communication Device Controlling Data Storage Area 20658*b* (FIG. 1424). As described in the present drawing, Communication Device Controlling Data Storage Area 20658*b* includes Password Data Storage Area 20658*b*1 and Work Area 20658*b*4. Password Data Storage Area 20658*b*1 stores the data described in FIG. 1426. Work Area 20658*b*4 is utilized as a work area to perform calculation and to temporarily store data.

FIG. 1426 illustrates the data stored in Password Data Storage Area 20658*b*1 (FIG. 1425). As described in the present drawing, Password Data Storage Area 20658*b*1 comprises two columns, i.e., 'User ID' and 'Password Data'. Column 'User ID' stores the user ID which represents the identification of the user of Communication Device 200. Column 'Password Data' stores the password data set by the user of Communication Device 200. Here, the password data is composed of alphanumeric data. Assuming that the user ID of Communication Device 200 is 'User#1'. In the example described in the present drawing, Password Data Storage Area H58*b*1 stores the following data: the user ID 'User#1' and the corresponding password data 'Password Data#1'.

FIG. 1427 illustrates the data stored in Phone Number Data Storage Area 20658*b*2 (FIG. 1425). As described in the present drawing, Phone Number Data Storage Area 20658*b*2 comprises two columns, i.e., 'User ID' and 'Phone Number Data'. Column 'User ID' stores the user ID of the user of Communication Device 200. Column 'Phone Number Data' stores the phone number data which represents the phone number of Communication Device 200. Here, the phone number data is composed of numeric data. In the example described in the present drawing, Phone Number Data Storage Area H58*b*2 stores the following data: the user ID 'User#1' and the corresponding phone number data 'Phone Number Data#1'.

FIG. 1428 illustrates the software programs stored in Communication Device Controlling Software Storage Area 20658*c* (FIG. 1424). As described in the present drawing, Communication Device Controlling Software Storage Area 20658*c* stores Line Connecting Software 20658*c*3, Manner Mode Deactivating Software 20658*c*4, Manner Mode Deactivating & Ringing Software 20658*c*5, Ringing Software 20658*c*6, Password Changing Software 20658*c*7, Device Locking Software 20658*c*8, and Power Off Software 20658*c*9. Line Connecting Software 20658*c*3 is the software program described in FIG. 1431. Manner Mode Deactivating Software 20658*c*4 is the software program described in FIG. 1432. Manner Mode Deactivating & Ringing Software 20658*c*5 is the software program described in FIG. 1433. Ringing Software 20658*c*6 is the software program described in FIG. 1434. Password Changing Software 20658*c*7 is the software program described in FIG. 1435. Device Locking Software 20658*c*8 is the software program described in FIG. 1436. Power Off Software 20658*c*9 is the software program described in FIG. 1437.

FIGS. 1429 through 1437 illustrate the software programs which enables the user of Communication Device 200 to remotely control Communication Device 200 by Personal Computer PC.

FIG. 1429 illustrates User Authenticating Software H58*c*1 (FIG. 1422) stored in Communication Device Controlling Software Storage Area H58*c* of Host H (FIG. 429), which authenticates the user of Communication Device 200 to implement the present function via Personal Computer PC. As described in the present drawing, Personal Computer PC sends an access request to Host H via the Internet (S1). Upon receiving the request from Personal Computer PC (S2) and the line is connected therebetween (S3), the user, by utilizing Personal Computer PC, inputs both his/her password data (S4) and the phone number data of Communication Device 200 (S5). Host H initiates the authentication process by referring to Password Data Storage Area H58*b*1 (FIG. 1419) and Phone Number Data Storage Area H58*b*2 (FIG. 1420)) (S6). The authentication process is completed (and the sequences described hereafter are enabled thereafter) if the password data and the phone number data described in S4 and S5 match with the data stored in Password Data Storage Area H58*b*1 and Phone Number Data Storage Area H58*b*2.

FIG. 1430 illustrates Menu Introducing Software H58*c*2 (FIG. 1422) stored in Communication Device Controlling Software Storage Area H58*c* of Host H (FIG. 429), which introduces the menu on Personal Computer PC. As described in the present drawing, Host H retrieves Web Display Data#0 from Web Display Data Storage Area H58*b*3 (FIG. 1421) (S1), and sends the data to Personal Computer PC (S2). Upon receiving Web Display Data#0 from Host H (S3), Personal Computer PC displays Web Display Data#0 on its display (S4). The user selects from one of the buttons of '1' through '6' wherein the sequences implemented thereafter are described in FIGS. 1431 through 1437 (S5).

FIG. 1431 illustrates Line Connecting Software H58*c*3 (FIG. 1422) stored in Communication Device Controlling Software Storage Area H58*c* of Host H (FIG. 429) and Line Connecting Software 20658*c*3 (FIG. 1428) stored in Communication Device Controlling Software Storage Area 20658*c* of Communication Device 200, which connect line between Host H and Communication Device 200. As described in the present drawing, Host H calls Communication Device 200 by retrieving the corresponding phone number data from Phone Number Data Storage Area H58*b*2 (FIG. 1420) (S1). Upon Communication Device 200 receiving the call from Host H (S2), the line is connected therebetween (S3). For the avoidance of doubt, the line is connected between Host H and Communication Device 200 merely to implement the present function, and a voice communication between human beings is not enabled thereafter.

FIG. 1432 illustrates Manner Mode Deactivating Software H58*c*4 (FIG. 1422) stored in Communication Device Controlling Software Storage Area H58*c* of Host H (FIG. 429) and Manner Mode Deactivating Software 20658*c*4 (FIG. 1428) stored in Communication Device Controlling Software Storage Area 20658*c* of Communication Device 200, which deactivate the manner mode of Communication Device 200. Here, Communication Device 200 activates Vibrator 217 (FIG. 1) when Communication Device 200 is in the manner mode and outputs a ringing sound from Speaker 216 (FIG. 1) when Communication Device 200 is not in the manner mode, upon receiving an incoming call. Assume that the user selects button '1" displayed on Personal Computer PC (S1). In response, Personal Computer PC sends the corresponding signal to Host H via the Internet (S2). Host H, upon receiving the signal described in S2, sends a manner mode deactivating command to Communication Device 200 (S3). Upon receiving the manner mode deactivating command from Host H (S4), Communication Device 200 deactivates the manner mode (S5). Host H retrieves Web Display Data#1 from Web Display Data Storage Area H**58*b*3 (FIG. 1421) and sends the data to Personal Computer PC (S6). Upon receiving Web Display Data#1 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200**. Therefore, a voice communication between human beings is not enabled thereafter.

FIG. 1433 illustrates Manner Mode Deactivating & Ringing Software H**58*c*5 (FIG. 1422) stored in Communication Device Controlling Software Storage Area H58*c* of Host H (FIG. 429) and Manner Mode Deactivating & Ringing Software 20658*c*5 (FIG. 1428) stored in Communication Device Controlling Software Storage Area 20658*c* of Communication Device 200, which deactivate the manner mode of Communication Device 200 and outputs a ringing sound thereafter. Assume that the user selects button '2' displayed on Personal Computer PC (S1). In response, Personal Computer PC sends the corresponding signal to Host H via the Internet (S2). Host H, upon receiving the signal described in S2, sends a manner mode deactivating & device ringing command to Communication Device 200 (S3). Upon receiving the manner mode deactivating & device ringing command from Host H (S4), Communication Device 200 deactivates the manner mode (S5) and outputs a ring data from Speaker 216 (S6). Host H retrieves Web Display Data#2 from Web Display Data Storage Area H58*b*3 (FIG. 1421) and sends the data to Personal Computer PC (S7). Upon receiving Web Display Data#2 from Host H, Personal Computer PC displays the data (S8). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Manner Mode Deactivating & Ringing Software H58*c*5 and Manner Mode Deactivating & Ringing Software 20658*c*5 is merely to let the user to identify the location of Communication Device 200**. Therefore, a voice communication between human beings is not enabled thereafter by implementing the present function.

FIG. 1434 illustrates Ringing Software H**58*c*6 (FIG. 1422) stored in Communication Device Controlling Software Storage Area H58*c* of Host H (FIG. 429) and Ringing Software 20658*c*6 (FIG. 1428) stored in Communication Device Controlling Software Storage Area 20658*c* of Communication Device 200, which output a ringing sound from Speaker 216 (FIG. 1). Assume that the user selects button '3" displayed on Personal Computer PC (S1). In response, Personal Computer PC sends the corresponding signal to Host H via the Internet (S2). Host H, upon receiving the signal described in S2, sends a device ringing command to Communication Device 200 (S3). Upon receiving the device ringing command from Host H (S4), Communication Device 200 outputs a ring data from Speaker 216 (S5). Host H retrieves Web Display Data#3 from Web Display Data Storage Area H58*b*3 (FIG. 1421) and sends the data to Personal Computer PC (S6). Upon receiving Web Display Data#3 from Host H, Personal Computer PC displays the data (S7). Normally the purpose to output the ringing sound from Speaker 216 is to give a notification to the user that Communication Device 200 has received an incoming call, and a voice communication is enabled thereafter upon answering the call. In contrast, the purpose to output the ringing sound from Speaker 216 by executing Ringing Software H58*c*6 and Ringing Software 20658*c*6 is merely to let the user to identify the location of Communication Device 200**. Therefore, a voice communication between human beings is not enabled thereafter by implementing the present function.

FIG. 1435 illustrates Password Changing Software H**58*c*7 (FIG. 1422) stored in Communication Device Controlling Software Storage Area H58*c* of Host H (FIG. 429) and Password Changing Software 20658*c*7 (FIG. 1428) stored in Communication Device Controlling Software Storage Area 20658*c* of Communication Device 200, which change the password necessary to operate Communication Device 200. Assume that the user selects button '4" displayed on Personal Computer PC (S1). In response, Personal Computer PC sends the corresponding signal to Host H via the Internet (S2). The user then enters a new password data by utilizing Personal Computer PC (S3), which is sent to Communication Device 200 by Host H (S4). Upon receiving the new password data from Host H (S5), Communication Device 200 stores the new password data in Password Data Storage Area 20658*b*1 (FIG. 1426) and the old password data is erased (S6). Host H retrieves Web Display Data#4 from Web Display Data Storage Area H58*b*3 (FIG. 1421) and sends the data to Personal Computer PC (S7). Upon receiving Web Display Data#4 from Host H, Personal Computer PC displays the data (S8**).

FIG. 1436 illustrates Device Locking Software H**58*c*8 (FIG. 1422) stored in Communication Device Controlling Software Storage Area H58*c* of Host H (FIG. 429) and Device Locking Software 20658*c*8 (FIG. 1428) stored in Communication Device Controlling Software Storage Area 20658*c* of Communication Device 200, which lock Communication Device 200, i.e., nullify any input signal input via Input Device 210 (FIG. 1). Assume that the user selects button '5' displayed on Personal Computer PC (S1). In response, Personal Computer PC sends the corresponding signal to Host H via the Internet (S2). Host H, upon receiving the signal described in S2, sends a device locking command to Communication Device 200 (S3). Upon receiving the device locking command from Host H (S4), Communication Device 200 is locked thereafter, i.e., any input via Input Device 210 is nullified unless a password data matching to the one stored in Password Data Storage Area 20658*b*1 (FIG. 1426) is entered (S5). Host H retrieves Web Display Data#5 from Web Display Data Storage Area H58*b*3 (FIG. 1421) and sends the data to Personal Computer PC (S6). Upon receiving Web Display Data#5 from Host H, Personal Computer PC displays the data (S7**).

FIG. 1437 illustrates Power Off Software H**58*c*9 (FIG. 1422) stored in Communication Device Controlling Software Storage Area H58*c* of Host H (FIG. 429) and Power Off Software 20658*c*9 (FIG. 1428) stored in Communication Device Controlling Software Storage Area 20658*c* of Communication Device 200, which turn off the power of Communication Device 200. Assume that the user selects button '6**' displayed on Personal Computer PC (S1). In response, Personal Computer PC sends the corresponding signal to Host H via the Internet (S2). Host H, upon receiving the signal described in S2, sends a power off command to Communication Device 200 (S3). Upon receiving the power off command from Host H (S4), Communication Device 200 turns off the power of itself (S5). Host H retrieves Web Display Data#6 from Web Display Data Storage Area H58b3 (FIG. 1421) and sends the data to Personal Computer PC (S6). Upon receiving Web Display Data#6 from Host H, Personal Computer PC displays the data (S7).

<<Communication Device Remote Controlling Function (by Web)—Summary>>

(1) A host computer connected to the Internet wherein, in response to a specific web signal received from a personal computer, said host computer sends a specific command the corresponding to said specific web signal.

(2) A communication device remote controlling software program stored in a host computer and/or a communication device wherein, in response to a specific web signal received from a personal computer, said communication device remote controlling software program sends a specific command the corresponding to said specific web signal to said communication device, said communication device under the command of said communication device remote controlling software program implements a specific communication device action in accordance with said specific command.

(3) The host computer of summary (1) thereby enabling the user of said personal computer to remotely control his/her communication device.

(4) The host computer of summary (1), wherein said specific command is a manner mode deactivating command.

(5) The host computer of summary (1), wherein said specific command is a device ringing command.

(6) The host computer of summary (1), wherein said specific command is a password changing command.

(7) The host computer of summary (1), wherein said specific command is a device locking command.

(8) The host computer of summary (1), wherein said specific command is a power off command.

(9) The communication device remote controlling software program of summary (2) thereby enabling the user of said personal computer to remotely control his/her communication device.

(10) The communication device remote controlling software program of summary (2), wherein said specific command is a manner mode deactivating command.

(11) The communication device remote controlling software program of summary (2), wherein said specific command is a device ringing command.

(12) The communication device remote controlling software program of summary (2), wherein said specific command is a password changing command.

(13) The communication device remote controlling software program of summary (2), wherein said specific command is a device locking command.

(14) The communication device remote controlling software program of summary (2), wherein said specific command is a power off command.

<<Shortcut Icon Displaying Function>>

FIGS. 1438 through 1455 illustrate the shortcut icon displaying function which displays one or more of shortcut icons on LCD 201 (FIG. 1) of Communication Device 200. The user of Communication Device 200 can execute the software programs in a convenient manner by selecting (e.g., clicking or double clicking) the shortcut icons. The foregoing software programs may be any software programs described in this specification.

FIG. 1438 illustrates the shortcut icons displayed on LCD 201 (FIG. 1) of Communication Device 200 by implementing the present function. Referring to the present drawing, three shortcut icons are displayed on LCD 201 (FIG. 1), i.e., Shortcut Icon#1, Shortcut Icon#2, and Shortcut Icon#3. The user of Communication Device 200 can execute the software programs by selecting (e.g., clicking or double clicking) one of the shortcut icons. For example, assume that Shortcut Icon#1 represents MS Word 97. By selecting (e.g., clicking or double clicking) Shortcut Icon#1, the user can execute MS Word 97 installed in Communication Device 200 or Host H. Three shortcut icons are illustrated in the present drawing, however, only for purposes of simplifying the explanation of the present function. Therefore, as many shortcut icons equivalent to the number of the software programs described in this specification may be displayed on LCD 201, and the corresponding software programs may be executed by implementing the present function.

FIG. 1439 illustrates the storage area included in RAM 206 (FIG. 1). As described in the present drawing, RAM 206 includes Shortcut Icon Displaying Information Storage Area 20659a of which the data and the software programs stored therein are described in FIG. 1440.

FIG. 1440 illustrates the storage areas included in Shortcut Icon Displaying Information Storage Area 20659a (FIG. 1439). As described in the present drawing, Shortcut Icon Displaying Information Storage Area 20659a includes Shortcut Icon Displaying Data Storage Area 20659b and Shortcut Icon Displaying Software Storage Area 20659c. Shortcut Icon Displaying Data Storage Area 20659b stores the data necessary to implement the present function, such as the ones described in FIG. 1441. Shortcut Icon Displaying Software Storage Area 20659c stores the software programs necessary to implement the present function, such as the ones described in FIG. 1446.

The data and software programs stored in Shortcut Icon Displaying Software Storage Area 20659c (FIG. 1440) are downloaded from Host H (FIG. 429) in the manner described in FIGS. 401 through 407.

FIG. 1441 illustrates the storage areas included in Shortcut Icon Displaying Data Storage Area 20659b (FIG. 1440). As described in the present drawing, Shortcut Icon Displaying Data Storage Area 20659b includes Shortcut Icon Image Data Storage Area 20659b1, Shortcut Icon Location Data Storage Area 20659b2, Shortcut Icon Link Data Storage Area 20659b3, and Selected Shortcut Icon Data Storage Area 20659b4. Shortcut Icon Image Data Storage Area 20659b1 stores the data described in FIG. 1442. Shortcut Icon Location Data Storage Area 20659b2 stores the data described in FIG. 1443. Shortcut Icon Link Data Storage Area 20659b3 stores the data described in FIG. 1444. Selected Shortcut Icon Data Storage Area 20659b4 stores the data described in FIG. 1445.

FIG. 1442 illustrates the data stored in Shortcut Icon Image Data Storage Area 20659b1 (FIG. 1441). As described in the present drawing, Shortcut Icon Image Data Storage Area 20659b1 comprises two columns, i.e., 'Shortcut Icon ID' and 'Shortcut Icon Image Data'. Column 'Shortcut Icon ID' stores the shortcut icon IDs, and each shortcut icon ID is the identification of the corresponding shortcut icon image data stored in column 'Shortcut Icon Image Data'. Column 'Shortcut Icon Image Data' stores the shortcut icon image data, and each shortcut icon image data is the image data of the shortcut icon displayed on LCD 201 (FIG. 1) as described in FIG.

1438. In the example described in the present drawing, Shortcut Icon Image Data Storage Area **20659*b*1 stores the following data: the shortcut icon ID 'Shortcut Icon#1' and the corresponding shortcut icon image data 'Shortcut Icon Image Data#1'; the shortcut icon ID 'Shortcut Icon#2' and the corresponding shortcut icon image data 'Shortcut Icon Image Data#2'; the shortcut icon ID 'Shortcut Icon#3' and the corresponding shortcut icon image data 'Shortcut Icon Image Data#3'; and the shortcut icon ID 'Shortcut Icon#4' and the corresponding shortcut icon image data 'Shortcut Icon Image Data#4**'.

FIG. 1443 illustrates the data stored in Shortcut Icon Location Data Storage Area **20659*b*2 (FIG. 1441). As described in the present drawing, Shortcut Icon Location Data Storage Area 20659*b*2 comprises two columns, i.e., 'Shortcut Icon ID' and 'Shortcut Icon Location Data'. Column 'Shortcut Icon ID' stores the shortcut icon IDs described hereinbefore. Column 'Shortcut Icon Location Data' stores the shortcut icon location data, and each shortcut icon location data indicates the location displayed on LCD 201 (FIG. 1) in (x,y) format of the shortcut icon image data of the corresponding shortcut icon ID. In the example described in the present drawing, Shortcut Icon Location Data Storage Area 20659*b*2 stores the following data: the shortcut icon ID 'Shortcut Icon#1' and the corresponding shortcut icon location data 'Shortcut Icon Location Data#1'; the shortcut icon ID 'Shortcut Icon#2' and the corresponding shortcut icon location data 'Shortcut Icon Location Data#2'; the shortcut icon ID 'Shortcut Icon#3' and the corresponding shortcut icon location data 'Shortcut Icon Location Data#3'; and the shortcut icon ID 'Shortcut Icon#4' and the corresponding shortcut icon location data 'Shortcut Icon Location Data#4**'.

FIG. 1444 illustrates the data stored in Shortcut Icon Link Data Storage Area **20659*b*3 (FIG. 1441). As described in the present drawing, Shortcut Icon Link Data Storage Area 20659*b*3 comprises two columns, i.e., 'Shortcut Icon ID' and 'Shortcut Icon Link Data'. Column 'Shortcut Icon ID' stores the shortcut icon IDs described hereinbefore. Column 'Shortcut Icon Link Data' stores the shortcut icon link data, and each shortcut icon link data represents the location in Communication Device 200 of the software program stored therein represented by the shortcut icon of the corresponding shortcut icon ID. In the example described in the present drawing, Shortcut Icon Link Data Storage Area 20659*b*3 stores the following data: the shortcut icon ID 'Shortcut Icon#1' and the corresponding shortcut icon link data 'Shortcut Icon Link Data#1'; the shortcut icon ID 'Shortcut Icon#2' and the corresponding shortcut icon link data 'Shortcut Icon Link Data#2'; the shortcut icon ID 'Shortcut Icon#3' and the corresponding shortcut icon link data 'Shortcut Icon Link Data#3'; and the shortcut icon ID 'Shortcut Icon#4' and the corresponding shortcut icon link data 'Shortcut Icon Link Data#4**'. The foregoing software program may be any software program described in this specification.

FIG. 1445 illustrates the data stored in Selected Shortcut Icon Data Storage Area **20659*b*4 (FIG. 1441). As described in the present drawing, Selected Shortcut Icon Data Storage Area 20659*b*4 stores one or more of shortcut icon IDs. Only the shortcut icon image data of the shortcut icon IDs stored in Selected Shortcut Icon Data Storage Area 20659*b*4 are displayed on LCD 201 (FIG. 1). In the example described in the present drawing, Selected Shortcut Icon Data Storage Area 20659*b*4 stores the following data: the shortcut icon IDs 'Shortcut Icon#1', 'Shortcut Icon#2', and 'Shortcut Icon#3', which means that only the shortcut icon image data corresponding to 'Shortcut Icon#1', 'Shortcut Icon#2', and 'Shortcut Icon#3' are displayed on LCD 201**.

FIG. 1446 illustrates the software programs stored in Shortcut Icon Displaying Software Storage Area **20659*c* (FIG. 1440). As described in the present drawing, Shortcut Icon Displaying Software Storage Area 20659*c* stores Shortcut Icon Displaying Software 20659*c*1, Software Executing Software 20659*c*2, Shortcut Icon Location Data Changing Software 20659*c*3, and Software Executing Software 20659*c*4. Shortcut Icon Displaying Software 20659*c*1 is the software program described in FIG. 1447. Software Executing Software 20659*c*2 is the software program described in FIG. 1448. Shortcut Icon Location Data Changing Software 20659*c*3 is the software program described in FIG. 1449. Software Executing Software 20659*c*4 is the software program described in FIG. 1455**.

FIG. 1447 illustrates Shortcut Icon Displaying Software **20659*c*1 stored in Shortcut Icon Displaying Software Storage Area 20659*c* of Communication Device 200, which displays the shortcut icon image data displayed on LCD 201 (FIG. 1) of Communication Device 200. Referring to the present drawing, CPU 211 (FIG. 1) refers to the shortcut icon IDs stored in Selected Shortcut Icon Data Storage Area 20659*b*4 (FIG. 1445) to identify the shortcut icon image data to be displayed on LCD 201 (FIG. 1) (S1). CPU 211 then retrieves the shortcut icon image data of the corresponding shortcut icon IDs identified in S1 from Shortcut Icon Image Data Storage Area 20659*b*1 (FIG. 1442) (S2). CPU 211 further retrieves the shortcut icon location data of the corresponding shortcut icon IDs identified in S1 from Shortcut Icon Location Data Storage Area 20659*b*2 (FIG. 1443) (S3). CPU 211 displays on LCD 201 (FIG. 1) the shortcut icon image data thereafter (S4**).

FIG. 1448 illustrates Software Executing Software **20659*c*2 stored in Shortcut Icon Displaying Software Storage Area 20659*c* of Communication Device 200, which executes the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 1444) from the shortcut icon ID identified in S2 (S3), and executes the corresponding software program (S4**).

FIG. 1449 illustrates Shortcut Icon Location Data Changing Software **20659*c*3 stored in Shortcut Icon Displaying Software Storage Area 20659*c* of Communication Device 200, which enables the user of Communication Device 200 to change the location of the shortcut icon image data displayed on LCD 201 (FIG. 1). Referring to the present drawing, the user of Communication Device 200 selects the shortcut icon image data displayed on LCD 201 (S1). CPU 211 (FIG. 1) then identifies the shortcut icon ID of the shortcut icon image data selected in S1 (S2). The user moves the shortcut icon selected in S1 by utilizing Input Device 210 (FIG. 1) or via voice recognition system (S3). CPU 211 then identifies the new location thereof (S4), and updates the shortcut icon location data stored in Shortcut Icon Location Data Storage Area 20659*b*2 (FIG. 1443) (S5**).

<<Shortcut Icon Displaying Function—Executing Software in Host H>>

FIGS. 1450 through 1455 illustrate the implementation of the present invention wherein the user of Communication Device 200 executes the software programs stored in Host H (FIG. 429) by selecting the shortcut icons displayed on LCD 201 (FIG. 1).

FIG. 1450 illustrates the storage areas included in Host H (FIG. 429). As described in the present drawing, Host H includes Shortcut Icon Displaying Information Storage Area H59*a* of which the data and the software programs stored therein are described in FIG. 1451.

FIG. 1451 illustrates the storage areas included in Shortcut Icon Displaying Information Storage Area H59*a* (FIG. 1450). As described in the present drawing, Shortcut Icon Displaying Information Storage Area H59*a* includes Shortcut Icon Displaying Data Storage Area H59*b* and Shortcut Icon Displaying Software Storage Area H59*c*. Shortcut Icon Displaying Data Storage Area H59*b* stores the data necessary to implement the present function on the side of Host H, such as the ones described in FIGS. 1452 and 1453. Shortcut Icon Displaying Software Storage Area H59*c* stores the software programs necessary to implement the present function on the side of Host H, such as the ones described in FIG. 1454.

FIG. 1452 illustrates the storage area included in Shortcut Icon Displaying Data Storage Area H59*b* (FIG. 1451). As described in the present drawing, Shortcut Icon Displaying Data Storage Area H59*b* includes Software Programs Storage Area H59*b*1. Software Programs Storage Area H59*b*1 stores the data described in FIG. 1453.

FIG. 1453 illustrates the data stored in Software Programs Storage Area H59*b*1 (FIG. 1452). As described in the present drawing, Software Programs Storage Area H59*b*1 comprises two columns, i.e., 'Software ID' and 'Software Program'. Column 'Software ID' stores the software IDs, and each software ID is an identification of the software program stored in column 'Software Program'. Column 'Software Program' stores the software programs. In the example described in the present drawing, Software Programs Storage Area H59*b*1 stores the following data: software ID 'Software#3' and the corresponding software program 'Software Program#3'; software ID 'Software#4' and the corresponding software program 'Software Program#4'; software ID 'Software#5' and the corresponding software program 'Software Program#5'; and software ID 'Software#6' and the corresponding software program 'Software Program#6'. Here, the software programs may be any software programs which are stored in Host H (FIG. 429) described in this specification. As another embodiment, the software programs may be any software programs stored in RAM 206 (FIG. 1) of Communication Device 200 described in this specification.

FIG. 1454 illustrates the software program stored in Shortcut Icon Displaying Software Storage Area H59*c* (FIG. 1451). As described in the present drawing, Shortcut Icon Displaying Software Storage Area H59*c* stores Software Executing Software H59*c*4. Software Executing Software H59*c*4 is the software program described in FIG. 1455.

FIG. 1455 illustrates Software Executing Software H59*c*4 stored in Shortcut Icon Displaying Software Storage Area H59*c* (FIG. 1454) of Host H (FIG. 429) and Software Executing Software 20659*c*4 stored in Shortcut Icon Displaying Software Storage Area 20659*c* (FIG. 1446) of Communication Device 200, which execute the corresponding software program upon selecting the shortcut icon image data displayed on LCD 201 (FIG. 1) of Communication Device 200. Referring to the present drawing, the user of Communication Device 200 selects the shortcut icon image data displayed on LCD 201 by utilizing Input Device 210 (FIG. 1) or via voice recognition system (S1). CPU 211 (FIG. 1) then identifies the shortcut icon ID of the shortcut icon image data selected in S1 (S2). CPU 211 identifies the shortcut icon link data stored in Shortcut Icon Link Data Storage Area 20659*b*3 (FIG. 1444) from the shortcut icon ID identified in S2 (S3), which is sent to Host H (S4). Upon receiving the shortcut icon link data from Communication Device 200 (S5), Host H executes the corresponding software program (S6) and produces the relevant display data, which are send to Communication Device 200 (S7). Upon receiving the relevant display data from Host H, Communication Device 200 displays the data on LCD 201 (S8).

<<Shortcut Icon Displaying Function—Summary>>

(1) A communication device comprising a microphone, a speaker, a display, an input device and a multiple mode implementor, wherein said multiple mode implementor implements a voice communication mode and a shortcut icon displaying mode, a series of audio data are input to and output from said microphone and said speaker respectively when said voice communication mode is implemented, a shortcut icon representing a specific software program is displayed on said display when said shortcut icon displaying mode is implemented.

(2) Said shortcut icon is displayed on predetermined location on said display.

(3) Said shortcut icon is displayed on a new location on said display when said shortcut icon is moved by the user of said communication device.

(4) A software program stored in a host computer which is linked to a predetermined shortcut icon is executed when said shortcut icon is selected by the user of said communication device.

<<Task Tray Icon Displaying Function>>

FIGS. 1456 through 1470 illustrate the task tray icon displaying function which displays one or more of task tray icons on LCD 201 (FIG. 1) of Communication Device 200. The user of Communication Device 200 can identify the software programs executed in background in a convenient manner. The foregoing software programs may be any software programs described in this specification.

FIG. 1456 illustrates the task tray icons displayed on LCD 201 (FIG. 1) of Communication Device 200 by implementing the present function. Referring to the present drawing, Display Area 20160DA Includes Task Tray Icons Display Area 20660DA1 which is displayed at the lower right portion of LCD 201. Three task tray icons are displayed Task Tray Icons Display Area 20660DA1, i.e., Task Tray Icon#1, Task Tray Icon#2, and Task Tray Icon#3, by which the user of Communication Device 200 can identify the software programs executed in background in a convenient manner, i.e., by observing Task Tray Icons Display Area 20660DA1. Three task tray icons are illustrated in the present drawing, however, only for purposes of simplifying the explanation of the present function. Therefore, as many task tray icons equivalent to the number of the software programs described in this specification may be displayed in Task Tray Icons Display Area 20660DA1, and the corresponding software programs executed in background by implementing the present function.

FIG. 1457 illustrates the storage area included in RAM 206 (FIG. 1). As described in the present drawing, RAM 206 includes Task Tray Icon Displaying Information Storage Area 20660*a* of which the data and the software programs stored therein are described in FIG. 1458.

FIG. 1458 illustrates the storage areas included in Task Tray Icon Displaying Information Storage Area 20660*a* (FIG. 1457). As described in the present drawing, Task Tray Icon Displaying Information Storage Area 20660*a* includes Task Tray Icon Displaying Data Storage Area 20660*b* and Task Tray Icon Displaying Software Storage Area 20660*c*. Task Tray Icon Displaying Data Storage Area **20660*b* stores the data necessary to implement the present function, such as the ones described in FIG. 1459. Task Tray Icon Displaying Software Storage Area 20660*c* stores the software programs necessary to implement the present function, such as the ones described in FIG. 1463**.

FIG. 1459 illustrates the storage areas included in Task Tray Icon Displaying Data Storage Area **20660*b* (FIG. 1458). As described in the present drawing, Task Tray Icon Displaying Data Storage Area 20660*b* includes Task Tray Icon Image Data Storage Area 20660*b*1, Task Tray Icon Link Data Storage Area 20660*b*3, and Selected Task Tray Icon Data Storage Area 20660*b*4. Task Tray Icon Image Data Storage Area 20660*b*1 stores the data described in FIG. 1460. Task Tray Icon Link Data Storage Area 20660*b*3 stores the data described in FIG. 1461. Selected Task Tray Icon Data Storage Area 20660*b*4 stores the data described in FIG. 1462**.

FIG. 1460 illustrates the data stored in Task Tray Icon Image Data Storage Area **20660*b*1 (FIG. 1459). As described in the present drawing, Task Tray Icon Image Data Storage Area 20660*b*1 comprises two columns, i.e., 'Task Tray Icon ID' and 'Task Tray Icon Image Data'. Column 'Task Tray Icon ID' stores the task tray icon IDs, and each task tray icon ID is the identification of the corresponding task tray icon image data stored in column 'Task Tray Icon Image Data'. Column 'Task Tray Icon Image Data' stores the task tray icon image data, and each task tray icon image data is the image data of the task tray icon displayed on LCD 201 (FIG. 1) as described in FIG. 1456. In the example described in the present drawing, Task Tray Icon Image Data Storage Area 20660*b*1 stores the following data: the task tray icon ID 'Task Tray Icon#1' and the corresponding task tray icon image data 'Task Tray Icon Image Data#1'; the task tray icon ID 'Task Tray Icon#2' and the corresponding task tray icon image data 'Task Tray Icon Image Data#2'; the task tray icon ID 'Task Tray Icon#3' and the corresponding task tray icon image data 'Task Tray Icon Image Data#3'; and the task tray icon ID 'Task Tray Icon#4' and the corresponding task tray icon image data 'Task Tray Icon Image Data#4**'.

FIG. 1461 illustrates the data stored in Task Tray Icon Link Data Storage Area **20660*b*3 (FIG. 1459). As described in the present drawing, Task Tray Icon Link Data Storage Area 20660*b*3 comprises two columns, i.e., 'Task Tray Icon ID' and 'Task Tray Icon Link Data'. Column 'Task Tray Icon ID' stores the task tray icon IDs described hereinbefore. Column 'Task Tray Icon Link Data' stores the task tray icon link data, and each task tray icon link data represents the location in Communication Device 200 of the software program stored therein represented by the task tray icon of the corresponding task tray icon ID. In the example described in the present drawing, Task Tray Icon Link Data Storage Area 20660*b*3 stores the following data: the task tray icon ID 'Task Tray Icon#1' and the corresponding task tray icon link data 'Task Tray Icon Link Data#1'; the task tray icon ID 'Task Tray Icon#2' and the corresponding task tray icon link data 'Task Tray Icon Link Data#2'; the task tray icon ID 'Task Tray Icon#3' and the corresponding task tray icon link data 'Task Tray Icon Link Data#3'; and the task tray icon ID 'Task Tray Icon#4' and the corresponding task tray icon link data 'Task Tray Icon Link Data#4**'. The foregoing software programs may be of any software programs described in this specification.

FIG. 1462 illustrates the data stored in Selected Task Tray Icon Data Storage Area **20660*b*4 (FIG. 1459). As described in the present drawing, Selected Task Tray Icon Data Storage Area 20660*b*4 stores one or more of task tray icon IDs. Only the task tray icon image data of the task tray icon IDs stored in Selected Task Tray Icon Data Storage Area 20660*b*4 are displayed in Task Tray Icons Display Area 20660DA1 (FIG. 1456). In the example described in the present drawing, Selected Task Tray Icon Data Storage Area 20660*b*4 stores the following data: the task tray icon IDs 'Task Tray Icon#1', 'Task Tray Icon#2', and 'Task Tray Icon#3', which means that only the task tray icon image data corresponding to 'Task Tray Icon#1', 'Task Tray Icon#2', and 'Task Tray Icon#3' are displayed in Task Tray Icons Display Area 20660DA1**.

FIG. 1463 illustrates the software programs stored in Task Tray Icon Displaying Software Storage Area **20660*c* (FIG. 1458). As described in the present drawing, Task Tray Icon Displaying Software Storage Area 20660*c* stores Software Executing Software 20660*c*2 and Software Executing Software 20660*c*4. Software Executing Software 20660*c*2 is the software program described in FIG. 1464. Software Executing Software 20660*c*4 is the software program described in FIG. 1470**.

FIG. 1464 illustrates Software Executing Software **20660*c*2 stored in Task Tray Icon Displaying Software Storage Area 20660*c* of Communication Device 200, which executes the corresponding software program in background and displays the corresponding task tray icon image data on LCD 201 (FIG. 1) of Communication Device 200. Referring to the present drawing, CPU 211 (FIG. 1) refers to Selected Task Tray Icon Data Storage Area 20660*b*4 (FIG. 1462) (S1) to identify the task tray IDs stored therein (S2). CPU 211 identifies the task tray icon link data stored in Task Tray Icon Link Data Storage Area 20660*b*3 (FIG. 1461) of the corresponding task tray icon IDs identified in S2 (S3), and executes the corresponding software program (S4). CPU 211 then retrieves the task tray icon image data of the corresponding task tray icon IDs identified in S2 from Task Tray Icon Image Data Storage Area 20660*b*1 (FIG. 1460) (S5). CPU 211 displays the task tray icon image data in Task Tray Icons Display Area 20660DA1 (FIG. 1456) thereafter (S6**).

<<Task Tray Icon Displaying Function—Executing Software in Host H>>

FIGS. 1465 through 1470 illustrate the implementation of the present invention wherein the software programs stored in Host H (FIG. 429) are executed.

FIG. 1465 illustrates the storage areas included in Host H (FIG. 429). As described in the present drawing, Host H includes Task Tray Icon Displaying Information Storage Area H**60*a* of which the data and the software programs stored therein are described in FIG. 1466**.

FIG. 1466 illustrates the storage areas included in Task Tray Icon Displaying Information Storage Area H**60*a* (FIG. 1465). As described in the present drawing, Task Tray Icon Displaying Information Storage Area H60*a* includes Task Tray Icon Displaying Data Storage Area H60*b* and Task Tray Icon Displaying Software Storage Area H60*c*. Task Tray Icon Displaying Data Storage Area H60*b* stores the data necessary to implement the present function on the side of Host H, such as the ones described in FIGS. 1467 and 1468. Task Tray Icon Displaying Software Storage Area H60*c* stores the software programs necessary to implement the present function on the side of Host H, such as the ones described in FIG. 1469**.

FIG. 1467 illustrates the storage area included in Task Tray Icon Displaying Data Storage Area H**60*b* (FIG. 1466). As described in the present drawing, Task Tray Icon Displaying Data Storage Area H60*b* includes Software Programs Storage Area H60*b*1. Software Programs Storage Area H60*b*1 stores the data described in FIG. 1468**.

FIG. 1468 illustrates the data stored in Software Programs Storage Area H**60*b*1 (FIG. 1467). As described in the present drawing, Software Programs Storage Area H60*b*1** comprises two columns, i.e., 'Software ID' and 'Software Program'.

Column 'Software ID' stores the software IDs, and each software ID is an identification of the software program stored in column 'Software Program'. Column 'Software Program' stores the software programs. In the example described in the present drawing, Software Programs Storage Area H60*b*1 stores the following data: software ID 'Software#3' and the corresponding software program 'Software Program#3'; software ID 'Software#4' and the corresponding software program 'Software Program#4'; software ID 'Software#5' and the corresponding software program 'Software Program#5'; and software ID 'Software#6' and the corresponding software program 'Software Program#6'. Here, the software programs may be any software programs which are stored in Host H (FIG. 429) described in this specification. As another embodiment, the software programs may be any software programs stored in RAM 206 (FIG. 1) of Communication Device 200 described in this specification.

FIG. 1469 illustrates the software program stored in Task Tray Icon Displaying Software Storage Area H60*c* (FIG. 1466). As described in the present drawing, Task Tray Icon Displaying Software Storage Area H60*c* stores Software Executing Software H60*c*4. Software Executing Software H60*c*4 is the software program described in FIG. 1470.

FIG. 1470 illustrates Software Executing Software H60*c*4 stored in Task Tray Icon Displaying Software Storage Area H60*c* (FIG. 1469) of Host H (FIG. 429) and Software Executing Software 20660*c*4 stored in Task Tray Icon Displaying Software Storage Area 20660*c* (FIG. 1463) of Communication Device 200, which execute the corresponding software program in background and displays the corresponding task tray icon image data on LCD 201 (FIG. 1) of Communication Device 200. Referring to the present drawing, CPU 211 (FIG. 1) of Communication Device 200 refers to Selected Task Tray Icon Data Storage Area 20660*b*4 (FIG. 1462) (S1) to identify the task tray IDs stored therein (S2). CPU 211 identifies the task tray icon link data stored in Task Tray Icon Link Data Storage Area 20660*b*3 (FIG. 1461) of the corresponding task tray icon IDs identified in S2 (S3), which is sent to Host H (S4). Upon receiving the task tray icon link data from Communication Device 200 (S5), Host H executes the corresponding software program (S6). CPU 211 then retrieves the task tray icon image data of the corresponding task tray icon IDs identified in S2 from Task Tray Icon Image Data Storage Area 20660*b*1 (FIG. 1460) (S7). CPU 211 displays the task tray icon image data in Task Tray Icons Display Area 20660DA1 (FIG. 1456) thereafter (S6).

<<Task Tray Icon Displaying Function—Summary>>

(1) A communication device comprising a microphone, a speaker, a display, an input device and a multiple mode implementor, wherein said multiple mode implementor implements a voice communication mode and a task tray icon displaying mode, a series of audio data are input to and output from said microphone and said speaker respectively when said voice communication mode is implemented, a task tray icon representing a specific software program is displayed on said display when said task tray icon displaying mode is implemented.

(2) Said task tray icon is displayed in a task tray icons display area.

(3) Said specific software program is executed in a host computer.

<<Multiple Channel Processing Function>>

FIGS. 1471 through 1498 illustrates the multiple channel processing function which enables Communication Device 200 to send and receive a large amount of data in a short period of time by increasing the upload and download speed.

FIG. 1471 illustrates the storage area included in Host H (FIG. 429). As described in the present drawing, Host H includes Multiple Channel Processing Information Storage Area H61*a* of which the data and the software programs stored therein are described in FIG. 1472. Here, Host H is a base station which communicates with Communication Device 200 in a wireless fashion.

FIG. 1472 illustrates the storage areas included in Multiple Channel Processing Information Storage Area H61*a* (FIG. 1471). As described in the present drawing, Multiple Channel Processing Information Storage Area H61*a* includes Multiple Channel Processing Data Storage Area H61*b* and Multiple Channel Processing Software Storage Area H61*c*. Multiple Channel Processing Data Storage Area H61*b* stores the data necessary to implement the present function on the side of Host H (FIG. 429), such as the ones described in FIGS. 1473 through 1478. Multiple Channel Processing Software Storage Area H61*c* stores the software programs necessary to implement the present function on the side of Host H, such as the ones described in FIG. 1479.

FIG. 1473 illustrates the storage areas included in Multiple Channel Processing Data Storage Area H61*b* (FIG. 1472). As described in the present drawing, Multiple Channel Processing Data Storage Area H61*b* includes User Data Storage Area H61*b*1, Channel Number Storage Area H61*b*2, and Signal Type Data Storage Area H61*b*3. User Data Storage Area H61*b*1 stores the data described in FIG. 1474. Channel Number Storage Area H61*b*2 stores the data described in FIGS. 1475 and 1476. Signal Type Data Storage Area H61*b*3 stores the data described in FIGS. 1477 and 1478.

FIG. 1474 illustrates the data stored in User Data Storage Area H61*b*1 (FIG. 1473). As described in the present drawing, User Data Storage Area H61*b*1 comprises two columns, i.e., 'User ID' and 'User Data'. Column 'User ID' stores the user IDs, and each user ID in an identification of the user of Communication Device 200. Column 'User Data' stores the user data, and each user data represents the personal data of the user of the corresponding user ID, such as name, home address, office address, phone number, email address, fax number, age, sex, credit card number of the user of the corresponding user ID. In the example described in the present drawing, User Data Storage Area H61*b*1 stores the following data: the user ID 'User#1' and the corresponding user data 'User Data#1'; the user ID 'User#2' and the corresponding user data 'User Data#2'; the user ID 'User#3' and the corresponding user data 'User Data#3'; and the user ID 'User#4' and the corresponding user data 'User Data#4'.

FIG. 1475 illustrates the data stored in Channel Number Storage Area H61*b*2 (FIG. 1473). As described in the present drawing, Channel Number Storage Area H61*b*2 comprises two columns, i.e., 'Channel ID' and 'User ID'. Column 'Channel ID' stores the channel IDs, and each channel ID is an identification of the channel which is assigned to each Communication Device 200 and through which Host H (FIG. 429) and Communication Device 200 send and receive data. Normally one channel ID is assigned to one user ID. Column 'User ID' stores the user IDs described hereinbefore. In the example described in the present drawing, Channel Number Storage Area H61*b*2 stores the following data: the channel ID 'Channel#1' and the user ID 'User#1'; the channel ID 'Channel#2' with no corresponding user ID stored; the channel ID 'Channel#3' and the user ID 'User#3'; and the channel ID 'Channel#4' and the user ID 'User#4'. Here, the foregoing data indicates that, to communicate with Host H (FIG. 429), the channel ID 'Channel#1' is utilized by Communication Device 200 represented by the user ID 'User#1'; the channel ID 'Channel#2' is not utilized by any Communication Device 200 (i.e., vacant); the channel ID 'Channel#3' is utilized by Communication Device 200 represented by the user ID 'User#3'; and the channel ID 'Channel#4' is utilized by Communication Device 200 represented by the user ID 'User#4'.

FIG. 1476 illustrates another example of the data stored in Channel Number Storage Area H61*b*2 (FIG. 1475). As described in the present drawing, Channel Number Storage Area H61*b*2 comprises two columns, i.e., 'Channel ID' and 'User ID'. Column 'Channel ID' stores the channel IDs described hereinbefore. Column 'User ID' stores the user IDs described hereinbefore. In the example described in the present drawing, Channel Number Storage Area H61*b*2 stores the following data: the channel ID 'Channel#1' and the user ID 'User#1'; the channel ID 'Channel#2' and the user ID 'User#1'; the channel ID 'Channel#3' and the user ID 'User#3'; and the channel ID 'Channel#4' and the user ID 'User#4'. Here, the foregoing data indicates that, to communicate with Host H (FIG. 429), the channel ID 'Channel#1' is utilized by Communication Device 200 represented by the user ID 'User#1'; the channel ID 'Channel#2' is also utilized by Communication Device 200 represented by the user ID 'User#1'; the channel ID 'Channel#3' is utilized by Communication Device 200 represented by the user ID 'User#3'; and the channel ID 'Channel#4' is utilized by Communication Device 200 represented by the user ID 'User#4'. In sum, the foregoing data indicates that two channel IDs, i.e., 'Channel#1' and 'Channel#2' are utilized by one Communication Device 200 represented by the user ID 'User#1'.

FIG. 1477 illustrates the data stored in Signal Type Data Storage Area H61*b*3 (FIG. 1473). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel#1' and the corresponding signal type data 'cdma2000'; the channel ID 'Channel#2' and the corresponding signal type data 'cdma2000'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'cdma2000'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in FIG. 1476. In the example described in the present drawing, Communication Device 200 represented by the user ID 'User#1' utilizes the signal type data 'cdma2000' for the channels represented by the channel ID 'Channel#1' and 'Channel#2' for communicating with Host H (FIG. 429).

FIG. 1478 illustrates another example of the data stored in Signal Type Data Storage Area H61*b*3 (FIG. 1473). As described in the present drawing, Signal Type Data Storage Area H61*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area H61*b*3 stores the following data: the channel ID 'Channel#1' and the corresponding signal type data 'cdma2000'; the channel ID 'Channel#2' and the corresponding signal type data 'W-CDMA'; the channel ID 'Channel#3' and the corresponding signal type data 'W-CDMA'; and the channel ID 'Channel#4' and the corresponding signal type data 'cdma2000'. The foregoing data indicates that the channel identified by the channel ID 'Channel#1' is assigned to the signal type data 'cdma2000'; the channel identified by the channel ID 'Channel#2' is assigned to the signal type data 'W-CDMA'; the channel identified by the channel ID 'Channel#3' is assigned to the signal type data 'W-CDMA'; and the channel identified by the channel ID 'Channel#4' is assigned to the signal type data 'cdma2000'. Assuming that Communication Device 200 represented by the user ID 'User#1' utilizes the channels represented by the channel ID 'Channel#1' and 'Channel#2' as described in FIG. 1476. In the example described in the present drawing, Communication Device 200 represented by the user ID 'User#1' utilizes the signal type data in a hybrid manner for communicating with Host H (FIG. 429), i.e., the signal type data 'cdma2000' for 'Channel#1' and the signal type data 'W-CDMA' for 'Channel#2'.

FIG. 1479 illustrates the software programs stored in Multiple Channel Processing Software Storage Area H61*c* (FIG. 1472). As described in the present drawing, Multiple Channel Processing Software Storage Area H61*c* stores Signal Type Data Detecting Software H61*c*1, User ID Identifying Software H61*c*2, Data Sending/Receiving Software H61*c*2*a*, Channel Number Adding Software H61*c*3, Data Sending/Receiving Software H61*c*3*a*, Signal Type Data Adding Software H61*c*4, and Data Sending/Receiving Software H61*c*4*a*. Signal Type Data Detecting Software H61*c*1 is the software program described in FIGS. 1488 and 1489. User ID Identifying Software H61*c*2 is the software program described in FIG. 1490. Data Sending/Receiving Software H61*c*2*a* is the software program described in FIGS. 1491 and 1492. Channel Number Adding Software H61*c*3 is the software program described in FIG. 1493. Data Sending/Receiving Software H61*c*3*a* is the software program described in FIGS. 1494 and 1495. Signal Type Data Adding Software H61*c*4 is the software program described in FIG. 1496. Data Sending/Receiving Software H61*c*4*a* is the software program described in FIGS. 1497 and 1498.

FIG. 1480 illustrates the storage area included in RAM 206 (FIG. 1) of Communication Device 200. As described in the present drawing, RAM 206 includes Multiple Channel Processing Information Storage Area 20661*a* of which the data and the software programs stored therein are described in FIG. 1481.

FIG. 1481 illustrates the storage areas included in Multiple Channel Processing Information Storage Area 20661*a* (FIG. 1480). As described in the present drawing, Multiple Channel Processing Information Storage Area 20661*a* includes Multiple Channel Processing Data Storage Area 20661*b* and Multiple Channel Processing Software Storage Area 20661*c*. Multiple Channel Processing Data Storage Area 20661*b* stores the data necessary to implement the present function on the side of Communication Device 200 (FIG. 429), such as the ones described in FIGS. 1482 through 1486. Multiple Channel Processing Software Storage Area 20661*c* stores the software programs necessary to implement the present function on the side of Communication Device 200, such as the ones described in FIG. 1487.

The data and software programs stored in Multiple Channel Processing Software Storage Area 20661*c* (FIG. 1481) are downloaded from Host H (FIG. 429) in the manner described in FIGS. 401 through 407.

FIG. 1481*a* illustrates the storage areas included in Multiple Channel Processing Data Storage Area 20661*b* (FIG. 1481). As described in the present drawing, Multiple Channel Processing Data Storage Area 20661*b* includes User Data Storage Area 20661*b*1, Channel Number Storage Area 20661*b*2, and Signal Type Data Storage Area 20661*b*3. User Data Storage Area 20661*b*1 stores the data described in FIG. 1482. Channel Number Storage Area 20661*b*2 stores the data described in FIGS. 1483 and 1484. Signal Type Data Storage Area 20661*b*3 stores the data described in FIGS. 1485 and 1486.

FIG. 1482 illustrates the data stored in User Data Storage Area 20661*b*1 (FIG. 1481*a*). As described in the present drawing, User Data Storage Area 20661*b*1 comprises two columns, i.e., 'User ID' and 'User Data'. Column 'User ID' stores the user ID which is an identification of Communication Device 200. Column 'User Data' stores the user data represents the personal data of the user of Communication Device 200, such as name, home address, office address, phone number, email address, fax number, age, sex, credit card number of the user. In the example described in the present drawing, User Data Storage Area 20661*b*1 stores the following data: the user ID 'User#1' and the corresponding user data 'User Data#1'.

FIG. 1483 illustrates the data stored in Channel Number Storage Area 20661*b*2 (FIG. 1481*a*). As described in the present drawing, Channel Number Storage Area 20661*b*2 comprises two columns, i.e., 'Channel ID' and 'User ID'. Column 'Channel ID' stores the channel ID which is an identification of the channel through which Host H (FIG. 429) and Communication Device 200 send and receive data. Column 'User ID' stores the user ID described hereinbefore. In the example described in the present drawing, Channel Number Storage Area 20661*b*2 stores the following data: the channel ID 'Channel#1' and the corresponding user ID 'User#1'. The foregoing data indicates that, to communicate with Host H (FIG. 429), the channel ID 'Channel#1' is utilized by Communication Device 200 represented by the user ID 'User#1'.

FIG. 1484 illustrates another example of the data stored in Channel Number Storage Area 20661*b*2 (FIG. 1481*a*). As described in the present drawing, Channel Number Storage Area 20661*b*2 comprises two columns, i.e., 'Channel ID' and 'User ID'. Column 'Channel ID' stores the channel IDs, and each channel ID is an identification of the channel through which Host H (FIG. 429) and Communication Device 200 send and receive data. Column 'User ID' stores the user ID described hereinbefore. In the example described in the present drawing, Channel Number Storage Area 20661*b*2 stores the following data: the channel ID 'Channel#1' and the corresponding user ID 'User#1'; and the channel ID 'Channel#2' and the corresponding user ID 'User#2'. The foregoing data indicates that, to communicate with Host H (FIG. 429), the channel IDs of 'Channel#1' and 'Channel#2' are utilized by Communication Device 200 represented by the user ID 'User#1'.

FIG. 1485 illustrates the data stored in Signal Type Data Storage Area 20661*b*3 (FIG. 1481*a*). As described in the present drawing, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661*b*3 stores the following data: the channel ID 'Channel#1' and the corresponding signal type data 'cdma2000'; and the channel ID 'Channel#2' and the corresponding signal type data 'cdma2000'. The foregoing data indicates that the channel identified by the channel ID 'Channel#1' is assigned to the signal type data 'cdma2000'; and the channel identified by the channel ID 'Channel#2' is assigned to the signal type data 'cdma2000'. In the example described in the present drawing, Communication Device 200 represented by the user ID 'User#1' utilizes the signal type data 'cdma2000' for the channels represented by the channel ID 'Channel#1' and 'Channel#2' for communicating with Host H (FIG. 429).

FIG. 1486 illustrates another example of the data stored in Signal Type Data Storage Area 20661*b*3 (FIG. 1481*a*). As described in the present drawing, Signal Type Data Storage Area 20661*b*3 comprises two columns, i.e., 'Channel ID' and 'Signal Type Data'. Column 'Channel ID' stores the channel IDs described hereinbefore. Column 'Signal Type Data' stores the signal type data, and each signal type data indicates the type of signal utilized for the channel represented by the corresponding channel ID. In the example described in the present drawing, Signal Type Data Storage Area 20661*b*3 stores the following data: the channel ID 'Channel#1' and the corresponding signal type data 'cdma2000'; and the channel ID 'Channel#2' and the corresponding signal type data 'W-CDMA'. The foregoing data indicates that the channel identified by the channel ID 'Channel#1' is assigned to the signal type data 'cdma2000'; and the channel identified by the channel ID 'Channel#2' is assigned to the signal type data 'W-CDMA'. In the example described in the present drawing, Communication Device 200 represented by the user ID 'User#1' utilizes the signal type data in a hybrid manner for communicating with Host H (FIG. 429), i.e., the signal type data 'cdma2000' for 'Channel#1' and the signal type data 'W-CDMA' for 'Channel#2'.

FIG. 1487 illustrates the software programs stored in Multiple Channel Processing Software Storage Area 20661*c* (FIG. 1481). As described in the present drawing, Multiple Channel Processing Software Storage Area 20661*c* stores Signal Type Data Detecting Software 20661*c*1, User ID Identifying Software 20661*c*2, Data Sending/Receiving Software 20661*c*2*a*, Channel Number Adding Software 20661*c*3, Data Sending/Receiving Software 20661*c*3*a*, Signal Type Data Adding Software 20661*c*4, and Data Sending/Receiving Software 20661*c*4*a*. Signal Type Data Detecting Software 20661*c*1 is the software program described in FIGS. 1488 and 1489. User ID Identifying Software 20661*c*2 is the software program described in FIG. 1490. Data Sending/Receiving Software 20661*c*2*a* is the software program described in FIGS. 1491 and 1492. Channel Number Adding Software 20661*c*3 is the software program described in FIG. 1493. Data Sending/Receiving Software 20661*c*3*a* is the software program described in FIGS. 1494 and 1495. Signal Type Data Adding Software 20661*c*4 is the software program described in FIG. 1496. Data Sending/Receiving Software 20661*c*4*a* is the software program described in FIGS. 1497 and 1498.

FIG. 1488 illustrates Signal Type Data Detecting Software H61*c*1 (FIG. 1479) of Host H (FIG. 429) and Signal Type Data Detecting Software 20661*c*1 (FIG. 1487) of Communication Device 200, which detect the signal type utilized for the communication between Host H and Communication Device 200 from the ones described in FIGS. 493*a* through 515 and from any signal type categorized as 2G, 3G, and 4G. The detection of the signal type is implemented by Host H in the present embodiment. As described in the present drawing, Host H detects the signal type (S1), and stores the signal type data in Signal Type Data Storage Area H61*b*3 (FIG. 1477) at the default channel number (in the present example, Channel#1) (S2). Host H then sends the signal type data to Communication Device 200 (S3). Upon receiving the signal type data from Host H (S4), Communication Device 200 stores the signal type data in Signal Type Data Storage Area **20661*b*3 (FIG. 1485) at the default channel number (in the present example, Channel#1) (S5**).

FIG. 1489 illustrates another embodiment of Signal Type Data Detecting Software H61*c*1 (FIG. 1479) of Host H (FIG. 429) and Signal Type Data Detecting Software 20661*c*1 (FIG. 1487) of Communication Device 200, which detect the signal type utilized for the communication between Host H and Communication Device 200 from the ones described in FIGS. 493*a* through 515 and from any signal type categorized as 2G, 3G, and 4G. The detection of the signal type is implemented by Communication Device 200 in the present embodiment. As described in the present drawing, CPU 211 (FIG. 1) of Communication Device 200 detects the signal type (S1), and stores the signal type data in Signal Type Data Storage Area **20661*b*3 (FIG. 1485) at the default channel number (in the present example, Channel#1) (S2). CPU 211 then sends the signal type data to Host H (S3). Upon receiving the signal type data from Communication Device 200** (S4), Host H stores the signal type data in Signal Type Data Storage Area H61*b*3 (FIG. 1477) at the default channel number (in the present example, Channel#1) (S5).

FIG. 1490 illustrates User ID Identifying Software H61*c*2 (FIG. 1479) of Host H (FIG. 429) and User ID Identifying Software 20661*c*2 (FIG. 1487) of Communication Device 200, which identify the user ID of the corresponding Communication Device 200. As described in the present drawing, Communication Device 200 sends the user ID to Host H (S1). Upon receiving the User ID from Communication Device 200 (S2), Host H identifies the default channel number (in the present example, Channel#1) for Communication Device 200 (S3), and stores the User ID in Channel Number Storage Area H61*b*2 (FIG. 1475) at the channel number identified in S3 (S4).

FIG. 1491 illustrates Data Sending/Receiving Software H61*c*2*a* (FIG. 1479) of Host H (FIG. 429) and Data Sending/Receiving Software 20661*c*2*a* (FIG. 1487) of Communication Device 200 by which Host H sends data to Communication Device 200. As described in the present drawing, Host H retrieves the default channel number (in the present example, Channel#1) from Channel Number Storage Area H61*b*2 (FIG. 1475) (S1), and sends data (e.g., audiovisual data and alphanumeric data) to Communication Device 200 through the default channel number (in the present example, Channel#1) retrieved in S1 (S2). Communication Device 200 receives the data (e.g., audiovisual data and alphanumeric data) from Host H through the same channel number (S3).

FIG. 1492 illustrates another embodiment of Data Sending/Receiving Software H61*c*2*a* (FIG. 1479) of Host H (FIG. 429) and Data Sending/Receiving Software 20661*c*2*a* (FIG. 1487) of Communication Device 200 by which Communication Device 200 sends data (e.g., audiovisual data and alphanumeric data) to Host H. As described in the present drawing, Communication Device 200 retrieves the default channel number (in the present example, Channel#1) from Channel Number Storage Area 20661*b*2 (FIG. 1483) (S1), and sends data (e.g., audiovisual data and alphanumeric data) to Host H through the default channel number (in the present example, Channel#1) retrieved in S1 (S2). Host H receives the data (e.g., audiovisual data and alphanumeric data) from Communication Device 200 through the same channel number (S3).

FIG. 1493 illustrates Channel Number Adding Software H61*c*3 (FIG. 1479) of Host H (FIG. 429) and Channel Number Adding Software 20661*c*3 (FIG. 1487) of Communication Device 200, which add another channel to increase the download and/or upload speed of Communication Device 200. As described in the present drawing, Communication Device 200 sends a channel number adding request to Host H (S1). Upon receiving the channel number adding request from Communication Device 200 (S2), Host H checks the availability in the same signal type data (S3). Assuming that vacancy is found in the same signal type data, Host H selects a new channel number (in the present example, Channel#2) from the available channel numbers for Communication Device 200 (S4). Host H stores the user ID of Communication Device 200 in Channel Number Storage Area H61*b*2 (FIG. 1475) at new channel number (in the present example, Channel#2) selected in S4 (S5). Host H then sends the new channel number (in the present example, Channel#2) selected in S4 to Communication Device 200 (S6). Upon receiving the new channel number (in the present example, Channel#2) from Host H (S7), Communication Device 200 stores the new channel number (in the present example, Channel#2) in Channel Number Storage Area 20661*b*2 (FIG. 1483) (S8). As another embodiment, instead of Host H adding a new channel number by receiving a channel number adding request from Communication Device 200, Host H may do so in its own initiative.

FIG. 1494 illustrates Data Sending/Receiving Software H61*c*3*a* (FIG. 1479) of Host H (FIG. 429) and Data Sending/Receiving Software 20661*c*3*a* (FIG. 1487) of Communication Device 200 by which Host H sends data to Communication Device 200 by increasing the download speed. As described in the present drawing, Host H retrieves the channel numbers (in the present example, Channel#1 and #2) from Channel Number Storage Area H61*b*2 (FIG. 1475) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 (S3), and sends the Second Data to Communication Device 200 through Channel#2 (S4). Communication Device 200 receives the First Data from Host H through Channel#1 (S5), and receives the Second Data from Host H through Channel#2 (S6). Communication Device 200 merges the First Data and the Second Data thereafter (S7).

FIG. 1495 illustrates Data Sending/Receiving Software H61*c*3*a* (FIG. 1479) of Host H (FIG. 429) and Data Sending/Receiving Software 20661*c*3*a* (FIG. 1487) of Communication Device 200 by which Communication Device 200 sends data to Host H by increasing the upload speed. As described in the present drawing, Communication Device 200 retrieves the channel numbers (in the present example, Channels #1 and #2) from Channel Number Storage Area 20661*b*2 (FIG. 1483) (S1). Communication Device 200 splits the data (e.g., audiovisual data and alphanumeric data) to be sent to Host H to the Third Data and the Fourth Data (S2). Communication Device 200 sends the Third Data to Host H through Channel#1 (S3), and sends the Fourth Data to Host H through Channel#2 (S4). Host H receives the Third Data from Communication Device 200 through Channel#1 (S5), and receives the Fourth Data from Communication Device 200 through Channel#2 (S6). Host H merges the Third Data and the Fourth Data thereafter (S7).

FIG. 1496 illustrates Signal Type Data Adding Software H61*c*4 (FIG. 1479) of Host H (FIG. 429) and Signal Type Data Adding Software 20661*c*4 (FIG. 1487) of Communication Device 200, which add new channel in different signal type if no available channel is found in the same signal type in S3 of FIG. 1493. As described in the present drawing, Host H checks the availability in other signal type data (S1). Assuming that an available new channel is found in W-CDMA. Host H selects a new channel number (in the present example, Channel#2) In Signal Type Data Storage Area H61*b*3 (FIG. 1478) for Communication Device 200 (S2). Host H stores the user ID (in the present example, User#1) in Channel Number Storage Area H61*b*2 (FIG. 1476) at new channel number selected in S2 (in the present example, Channel#2) (S3). Host H stores the signal type data (in the present example, W-CDMA) in Signal Type Data Storage Area H61*b*3 (FIG. 1478) at new channel number selected in S2 (in the present example, Channel#2) (S4). Host H sends the new channel number (in the present example, Channel#2) and the new signal type data (in the present example, W-CDMA) to Communication Device 200 (S5). Communication Device 200 receives the new channel number (in the present example, Channel#2) and the new signal type data (in the present example, W-CDMA) from Host H (S6). Communication Device 200 stores the new channel number (in the present example, Channel#2) in Channel Number Storage Area 20661*b*2 (FIG. 1484) (S7). Communication Device 200 (in the present example, W-CDMA) in Signal Type Data Storage Area 20661*b*3 (FIG. 1486) (S8).

FIG. 1497 illustrates Data Sending/Receiving Software H61*c*4*a* (FIG. 1479) of Host H (FIG. 429) and Data Sending/Receiving Software 20661*c*4*a* (FIG. 1487) of Communication Device 200 by which Host H sends data to Communication Device 200 by increasing the download speed. As described in the present drawing, Host H retrieves the channel numbers (in the present example, Channel#1 and #2) from Channel Number Storage Area H61*b*2 (FIG. 1476) of the corresponding user ID (in the present example, User#1) (S1). Host H splits the data (e.g., audiovisual data and alphanumeric data) to be sent to Communication Device 200 to the First Data and the Second Data (S2). Host H sends the First Data to Communication Device 200 through Channel#1 in cdma2000 (S3), and sends the Second Data to Communication Device 200 through Channel#2 in W-CDMA (S4). Communication Device 200 receives the First Data from Host H through Channel#1 in cdma2000 (S5), and receives the Second Data from Host H through Channel#2 in W-CDMA (S6). Communication Device 200 merges the First Data and the Second Data thereafter (S7).

FIG. 1498 illustrates Data Sending/Receiving Software H61*c*4*a* (FIG. 1479) of Host H (FIG. 429) and Data Sending/Receiving Software 20661*c*4*a* (FIG. 1487) of Communication Device 200 by which Communication Device 200 sends data to Host H by increasing the upload speed. As described in the present drawing, Communication Device 200 retrieves the channel numbers (in the present example, Channel#1 and #2) from Channel Number Storage Area 20661*b*2 (FIG. 1484) (S1). Communication Device 200 splits the data (e.g., audiovisual data and alphanumeric data) to be sent to Host H to the Third Data and the Fourth Data (S2). Communication Device 200 sends the Third Data to Host H through Channel#1 in cdma2000 (S3), and sends the Fourth Data to Host H through Channel#2 in W-CDMA (S4). Host H receives the Third Data from Communication Device 200 through Channel#1 in cdma2000 (S5), and receives the Fourth Data from Communication Device 200 through Channel#2 in W-CDMA (S6). Host H merges the Third Data and the Fourth Data thereafter (S7).

As another embodiment, the present function may be utilized for processing other sets of combination of the signals, such as the 2G signal and the 3G signal. In order to implement this embodiment, the term 'cdma2000' is substituted by '2G' and the term 'W-CDMA' is substituted by '3G' in the explanation set out hereinbefore for purposes of implementing the present embodiment. Here, the 2G signal may be of any type of signal categorized as 2G, including, but not limited to cdmaOne, GSM, and D-AMPS; the 3G signal may be of any type of signal categorized as 3G, including, but not limited to cdma2000, W-CDMA, and TDS-CDMA.

As another embodiment, the present function may be utilized for processing other sets of combination of the signals, such as the 3G signal and the 4G signal. In order to implement this embodiment, the term 'cdma2000' is substituted by '3G' and the term 'W-CDMA' is substituted by '4G' in the explanation set out hereinbefore for purposes of implementing the present embodiment. Here, the 3G signal may be of any type of signal categorized as 3G, including, but not limited to cdma2000, W-CDMA, and TDS-CDMA, and the 4G signal may be of any type of signal categorized as 4G.

As another embodiment, the present function may be utilized for processing the first type of 4G signal and the second type of 4G signal. In order to implement this embodiment, the term 'cdma2000' is substituted by 'the first type of 4G signal' and the term 'W-CDMA' is substituted by 'the second type of 4G signal' for purposes of implementing the present embodiment. Here, the first type of 4G signal and the second type of 4G signal may be of any type of signal categorized as 4G.

As another embodiment, the present function may be utilized for processing the 2G signal and the 3G signal. In order to implement this embodiment, the term 'cdma2000' is substituted by 'the 2G signal' and the term 'W-CDMA' is substituted by 'the 3G signal' for purposes of implementing the present embodiment. Here, the 2G signal may be of any type of signal categorized as 2G, including, but not limited to cdmaOne, GSM, and D-AMPS, and the 3G signal may be of any type of signal categorized as 3G, including, but not limited to cdma2000, W-CDMA, and TDS-CDMA.

As another embodiment, the present function may be utilized for processing the first type of 2G signal and the second type of 2G signal. In order to implement this embodiment, the term 'cdma2000' is substituted by 'the first type of 2G signal' and the term 'W-CDMA' is substituted by 'the second type of 2G signal' for purposes of implementing the present embodiment. Here, the first type of 2G signal and the second type of 2G signal may be of any type of signal categorized as 2G, including, but not limited to cdmaOne, GSM, and D-AMPS.

In sum, the present function described hereinbefore may be utilized for processing any combination of any type of signals.

For the avoidance of doubt, the multiple signal processing function (described in FIGS. 493*a* through 515) may be utilized while implementing the present function.

For the avoidance of doubt, all software programs described hereinbefore to implement the present function may be executed solely by CPU 211 (FIG. 1) or by Signal Processor 208 (FIG. 1), or by both CPU 211 and Signal Processor 208.

<<Multiple Channel Processing Function—Summary>>

(1) A communication device comprising a microphone, a speaker, a display, an input device and a multiple mode implementor, wherein said multiple mode implementor implements a voice communication mode and a multiple channel processing mode, a series of audio data are input to and output from said microphone and said speaker respectively when said voice communication mode is implemented, a data is sent via a plurality of channels when said multiple channel processing mode is implemented.

(2) The communication device of the summary (1) thereby enabling said communication device to send and receive data in a shorter period of time when said multiple channel processing mode is implemented.

(3) The communication device of the summary (1), wherein said plurality of channels comprises a first channel and a second channel wherein said first channel is established on first Signal Type Data and said second channel is established on second Signal Type Data.

(4) The communication device of the summary (1), wherein said plurality of channels comprises a first channel and a second channel wherein said first channel is established on cdma2000 and said second channel is established on W-CDMA.

(5) A communication device of the summary (1) wherein communication device is capable to process email data.

(6) A communication device of the summary (1) wherein said communication device is capable to process voice communication data.

(7) A communication device of the summary (1) wherein said communication device is capable to process email data and voice communication data.

<<Solar Battery Charging Function>>

FIG. 1499 illustrates the storage area included in RAM 206 (FIG. 1). As described in the present drawing, RAM 206 includes Solar Battery Charging Information Storage Area 20662*a* of which the data and the software programs stored therein are described in FIG. 1500.

FIG. 1500 illustrates the storage areas included in Solar Battery Charging Information Storage Area 20662*a* (FIG. 1499). As described in the present drawing, Solar Battery Charging Information Storage Area 20662*a* includes Solar Battery Charging Data Storage Area 20662*b* and Solar Battery Charging Software Storage Area 20662*c*. Solar Battery Charging Data Storage Area 20662*b* stores the data necessary to implement the present function, such as the ones described in FIGS. 1501 through 1504. Solar Battery Charging Software Storage Area 20662*c* stores the software programs necessary to implement the present function, such as the ones described in FIG. 1505.

FIG. 1501 illustrates the storage areas included in Solar Battery Charging Data Storage Area 20662*b* (FIG. 1500). As described in the present drawing, Solar Battery Charging Data Storage Area 20662*b* includes Solar Battery Data Storage Area 20662*b*1, Battery Image Data Storage Area 20662*b*2, and Battery Sound Data Storage Area 20662*b*3. Solar Battery Data Storage Area 20662*b*1 stores the data described in FIG. 1502. Battery Image Data Storage Area 20662*b*2 stores the data described in FIG. 1503. Battery Sound Data Storage Area 20662*b*3 stores the data described in FIG. 1504.

FIG. 1502 illustrates the data stored in Solar Battery Data Storage Area 20662*b*1 (FIG. 1501). As described in the present drawing, Solar Battery Data Storage Area 20662*b*1 stores the solar battery data. Here, the solar battery data is the data which indicates the amount of battery left in Battery 230 (FIG. 467).

FIG. 1503 illustrates the data stored in Battery Image Data Storage Area 20662*b*2 (FIG. 1501). As described in the present drawing, Battery Image Data Storage Area 20662*b*2 comprises two columns, i.e., 'Battery Image ID' and 'Battery Image Data'. Column 'Battery Image ID' stores the battery image IDs, and each battery image ID in an identification of the corresponding battery image data stored in column 'Battery Image Data'. Column 'Battery Image Data' stores the battery image data, and each battery image data is an image data designed to be displayed on upper left corner of LCD 201 (FIG. 1) to indicate the amount of battery left in Battery 230 (FIG. 467). In the example described in the present drawing, Battery Image Data Storage Area 20662*b*2 stores the following data: battery image ID 'Battery Image#1' and the corresponding battery image data 'Battery Image Data#1'; battery image ID 'Battery Image#2' and the corresponding battery image data 'Battery Image Data#2'; battery image ID 'Battery Image#3' and the corresponding battery image data 'Battery Image Data#3'; battery image ID 'Battery Image#4' and the corresponding battery image data 'Battery Image Data#4'; and battery image ID 'Battery Image#5' and the corresponding battery image data 'Battery Image Data#5'. Here, Battery Image Data#1 is an image data representing three bars; Battery Image Data#2 is an image data representing two bars; Battery Image Data#3 is an image data representing one bar; Battery Image Data#4 is an image data representing no bars; Battery Image Data#5 is an image data representing that Communication Device 200 is currently charging Battery 230 (FIG. 467) via Solar Panel 229 (FIG. 467) by implementing the present function. Battery Image Data#1 is displayed when the remaining amount of battery is over 75% and 100% or less; Battery Image Data#2 is displayed when the remaining amount of battery is over 50% and 75% or less; Battery Image Data#3 is displayed when the remaining amount of battery is over 25% and 50% or less; and Battery Image Data#4 is displayed when the remaining amount of battery is 0% or over and 25% or less. Battery Image Data#5 is displayed when Communication Device 200 is currently charging Battery 230 (FIG. 467) via Solar Panel 229 (FIG. 467) by implementing the present function.

FIG. 1504 illustrates the data stored in Battery Sound Data Storage Area 20662*b*3 (FIG. 1501). As described in the present drawing, Battery Sound Data Storage Area 20662*b*3 comprises two columns, i.e., 'Battery Sound ID' and 'Battery Sound Data'. Column 'Battery Sound ID' stores the battery sound IDs, and each battery sound ID is an identification of the corresponding battery sound data stored in column 'Battery Sound Data'. Column 'Battery Sound Data' stores the battery sound data, and each battery sound data is a sound data designed to be output from Speaker 216 (FIG. 1) to indicate the amount of battery left in Battery 230 (FIG. 467). In the example described in the present drawing, Battery Sound Data Storage Area 20662*b*3 stores the following data: the battery sound ID 'Battery Sound#1' and the corresponding battery sound data 'Battery Sound Data#1'; the battery sound ID 'Battery Sound#2' and the corresponding battery sound data 'Battery Sound Data#2'; the battery sound ID 'Battery Sound#3' and the corresponding battery sound data 'Battery Sound Data#3'; and the battery sound ID 'Battery Sound#4' and the corresponding battery sound data 'Battery Sound Data#4'. Here, Battery Sound Data#1 is a sound data representing four beeps; Battery Sound Data#2 is a sound data representing three beeps; Battery Sound Data#3 is a sound data representing two beeps; and Battery Sound Data#4 is a sound data representing one beep. Battery Sound Data#1 is output when the remaining amount of battery is over 75% and 100% or less; Battery Sound Data#2 is output when the remaining amount of battery is over 50% and 75% or less; Battery Sound Data#3 is output when the remaining amount of battery is over 25% and 50% or less; Battery Sound Data#4 is output when the remaining amount of battery is 0% or over and 25% or less.

FIG. 1505 illustrates the software programs stored in Solar Battery Charging Software Storage Area 20662*c* (FIG. 1500). As described in the present drawing, Solar Battery Charging Software Storage Area 20662*c* stores Solar Battery Data Checking Software 20662*c*1, Battery Image Data Displaying Software 20662*c*2, Battery Charging Software 20662*c*3, and Battery Charge Indicating Software 20662*c*4. Solar Battery Data Checking Software 20662*c*1 is the software program described in FIG. 1506. Battery Image Data Displaying Software 20662*c*2 is the software program described in FIG. 1507. Battery Charging Software 20662*c*3 is the software program described in FIG. 1508. Battery Charge Indicating Software 20662*c*4 is the software program described in FIG. 1509.

FIG. 1506 illustrates Solar Battery Data Checking Software 20662*c*1 (FIG. 1505) of Communication Device 200, which checks the remaining amount of battery. As described in the present drawing, CPU 211 (FIG. 1) of Communication Device 200 periodically checks the remaining amount of battery by referring to the solar battery data stored in Solar Battery Data Storage Area 20662*b*1 (FIG. 1502) (S1). For example, assume that the remaining amount is 30%. Then CPU 211 updates the solar battery data stored in Solar Battery Data Storage Area 20662*b*1 (FIG. 1502) to the data indicating that the remaining amount is 30% (S2).

FIG. 1507 illustrates Battery Image Data Displaying Software 20662*c*2 (FIG. 1505) of Communication Device 200, which displays the relevant battery image data on LCD 201 (FIG. 1). As described in the present drawing, CPU 211 (FIG. 1) periodically checks the remaining amount of battery by referring to the solar battery data stored in Solar Battery Data Storage Area 20662*b*1 (FIG. 1502) (S1). CPU 211 then determines the battery image data to be displayed on LCD 201 (S2). Battery Image Data#1 stored in Battery Image Data Storage Area 20662*b*2 (FIG. 1503) is displayed when the remaining amount of battery is over 75% and 100% or less; Battery Image Data#2 is displayed when the remaining amount of battery is over 50% and 75% or less; Battery Image Data#3 is displayed when the remaining amount of battery is over 25% and 50% or less; and Battery Image Data#4 is displayed when the remaining amount of battery is 0% or over and 25% or less. CPU 211 displays the battery image data on LCD 201 determined in S2 thereafter (S3). Assume that the remaining amount of battery is determined as 30% in S1. Then CPU 211 determines Battery Image Data#3 as the battery image data to be displayed in S2, and retrieves from Battery Image Data Storage Area 20662*b*2 (FIG. 1503) and displays the data on LCD 201 in S3. As another embodiment, CPU 211 may retrieve the relevant battery sound data from Battery Sound Data Storage Area 20662*b*3 FIG. (1504) and output from Speaker 216 (FIG. 1) when displaying the battery image data on LCD 201. Namely, Battery Sound Data#1 is output from Speaker 216 when Battery Image Data#1 is displayed on LCD 201; Battery Sound Data# is output from Speaker 216 when Battery Image Data#2 is displayed on LCD 201; Battery Sound Data# is output from Speaker 216 when Battery Image Data#3 is displayed on LCD 201; and Battery Sound Data# is output from Speaker 216 when Battery Image Data#4 is displayed on LCD 201.

FIG. 1508 illustrates Battery Charging Software 20662*c*3 (FIG. 1505) of Communication Device 200, which charges Battery 230 (FIG. 467) via Solar Panel 229 (FIG. 467). As described in the present drawing, CPU 211 (FIG. 1) periodically checks the remaining amount of battery by referring to the solar battery data stored in Solar Battery Data Storage Area 20662*b*1 (FIG. 1502) (S1). If the remaining amount is 75% or less (S2), CPU 211 charges Battery 230 (FIG. 467) via Solar Panel 229 (FIG. 467) until it is fully charged (S3). Assume that the remaining amount of battery is determined as 30% in S1. Since 30% is below the criteria of 75% in S2, CPU 211 charges Battery 230 (FIG. 467) via Solar Panel 229 (FIG. 467) until it is fully charged in S3.

FIG. 1509 illustrates Battery Charge Indicating Software 20662*c*4 (FIG. 1505) of Communication Device 200, which displays the battery image data indicating that Battery 230 (FIG. 467) is currently charged via Solar Panel 229 (FIG. 467) on LCD 201 (FIG. 1). As described in the present drawing, CPU 211 (FIG. 1) periodically checks the charging status by referring to the activity of Battery Charging Software 20662*c*3 (FIG. 1508) (S1). If Battery Charging Software 20662*c*3 is active, i.e., Charge Battery 230 is currently being charged via Solar Panel 229 (S2), CPU 211 displays Battery Image Data#50*n* LCD 201 (FIG. 1) (S3).

<<Solar Battery Charging Function—Summary>>

A communication device comprising a microphone, a speaker, a display, an input device, a battery, a solar system, and a multiple mode implementor, wherein said multiple mode implementor implements a voice communication mode and a solar battery charging mode, a series of audio data are input to and output from said microphone and said speaker respectively when said voice communication mode is implemented, said battery is charged by utilizing said solar system when said solar battery charging mode is implemented.

<<OS Updating Function>>

FIGS. 1510 through 1575 illustrate the OS updating function which updates the operating system of Communication Device 200 in a wireless fashion. In other words, Communication Device 200 downloads the portion of the operating system of the latest version from Host H (FIG. 429) via Antenna 218 (FIG. 1).

FIG. 1510 illustrates the storage areas included in RAM 206 (FIG. 1). As described in the present drawing, RAM 206 includes Operating System 20663OS of which the data stored therein are described in FIGS. 1511 and 1512, and OS Updating Information Storage Area 20663*a* of which the data and the software programs stored therein are described in FIG. 1513.

FIGS. 1511 and 1512 illustrate the data stored in Operating System 20663OS (FIG. 1510). As described in the present drawing, Operating System 20663OS includes Battery Controller 20663OSa, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx. Battery Controller 20663OSa is a controller which controls Battery 230 (FIG. 467). CCD Unit Controller 20663OSb is a controller which controls CCD Unit 214 (FIG. 467). Flash Light Unit Controller 20663OSc is a controller which controls Flash Light Unit 220 (FIG. 467). Indicator Controller 20663OSd is a controller which controls Indicator 212 (FIG. 467). Input Device Controller 20663OSe is a controller which controls Input Device 210 (FIG. 467). LCD Controller 20663OSf is a controller which controls LCD 201 (FIG. 467).

LED Controller 20663OSg is a controller which controls LED 219 (FIG. 467). Memory Card Interface Controller 20663OSh is a controller which controls Memory Card Interface 221 (FIG. 467). Microphone Controller 20663OSi is a controller which controls Microphone 215 (FIG. 467). Photometer Controller 20663OSj is a controller which controls Photometer 232 (FIG. 467). RAM Controller 20663OSk is a controller which controls RAM 206 (FIG. 467). ROM Controller 20663OSl is a controller which controls ROM 207 (FIG. 467). Signal Processor Controller 20663OSm is a controller which controls Signal Processor 205 (FIG. 467). Signal Processor Controller 20663OSn is a controller which controls Signal Processor 208 (FIG. 467). Solar Panel Controller 20663OSo is a controller which controls Solar Panel 229 (FIG. 467). Speaker Controller 20663OSp is a controller which controls Speaker 216L (FIG. 467). Vibrator Controller 20663OSq is a controller which controls Vibrator 217 (FIG. 467). Video Processor Controller 20663OSr is a controller which controls Video Processor 202 (FIG. 467). Wireless Receiver Controller 20663OSs is a controller which controls Wireless Receiver 224 (FIG. 467). Wireless Receiver Controller 20663OSt is a controller which controls Wireless Receiver 225 (FIG. 467). Wireless Receiver Controller 20663OSu is a controller which controls Wireless Receiver 226 (FIG. 467). Wireless Transmitter Controller 20663OSv is a controller which controls Wireless Transmitter 222 (FIG. 467). Wireless Transmitter Controller 20663OSw is a controller which controls Wireless Transmitter 223 (FIG. 467). Wireless Transmitter Controller 20663OSx is a controller which controls Wireless Transmitter 227 (FIG. 467). For the avoidance of doubt, the data stored in Operating System 20663OS are illustrative, and other types of data, which are updated by implementing the present function, are also stored therein, such as DLLs, drivers, security implementing program.

FIG. 1513 illustrates the storage areas included in OS Updating Information Storage Area 20663*a* (FIG. 1510). As described in the present drawing, OS Updating Information Storage Area 20663*a* includes OS Updating Data Storage Area 20663*b* and OS Updating Software Storage Area 20663*c*. OS Updating Data Storage Area 20663*b* stores the data necessary to implement the present function on the side of Communication Device 200, such as the ones described in FIG. 1514. OS Updating Software Storage Area 20663*c* stores the software programs necessary to implement the present function on the side of Communication Device 200, such as the ones described in FIGS. 1517 and 1518.

The software programs stored in OS Updating Software Storage Area 20663*c* (FIG. 1513) are downloaded from Host H (FIG. 429) in the manner described in FIGS. 401 through 407.

FIG. 1514 illustrates the storage area included in OS Updating Data Storage Area 20663*b* (FIG. 1513). As described in the present drawing, OS Updating Data Storage Area 20663*b* includes OS Version Data Storage Area 20663*b*1. OS Version Data Storage Area 20663*b*1 stores the data described in FIGS. 1515 and 1516.

FIGS. 1515 and 1516 illustrate the data stored in OS Version Data Storage Area 20663*b*1 (FIG. 1514). As described in the present drawing, OS Version Data Storage Area 20663*b*1 includes Battery Controller Version Data 20663*b*1*a*, CCD Unit Controller Version Data 20663*b*1*b*, Flash Light Unit Controller Version Data 20663*b*1*c*, Indicator Controller Version Data 20663*b*1*d*, Input Device Controller Version Data 20663*b*1*e*, LCD Controller Version Data 20663*b*1*f*, LED Controller Version Data 20663*b*1*g*, Memory Card Interface Controller Version Data 20663*b*1*h*, Microphone Controller Version Data 20663*b*1*i*, Photometer Controller Version Data 20663*b*1*j*, RAM Controller Version Data 20663*b*1*k*, ROM Controller Version Data 20663*b*1*l*, Signal Processor Controller Version Data 20663*b*1*m*, Signal Processor Controller Version Data 20663*b*1*n*, Solar Panel Controller Version Data 20663*b*1*o*, Speaker Controller Version Data 20663*b*1*p*, Vibrator Controller Version Data 20663*b*1*q*, Video Processor Controller Version Data 20663*b*1*r*, Wireless Receiver Controller Version Data 20663*b*1*s*, Wireless Receiver Controller Version Data 20663*b*1*t*, Wireless Receiver Controller Version Data 20663*b*1*u*, Wireless Transmitter Controller Version Data 20663*b*1*v*, Wireless Transmitter Controller Version Data 20663*b*1*w*, and Wireless Transmitter Controller Version Data 20663*b*1*x*. Battery Controller Version Data 20663*b*1*a* is the version data representing the current version of Battery Controller 20663OSa (FIG. 1511). CCD Unit Controller Version Data 20663*b*1*b* is the version data representing the current version of CCD Unit Controller 20663OSb (FIG. 1511). Flash Light Unit Controller Version Data 20663*b*1*c* is the version data representing the current version of Flash Light Unit Controller 20663OSc (FIG. 1511). Indicator Controller Version Data 20663*b*1*d* is the version data representing the current version of Indicator Controller 20663OSd (FIG. 1511). Input Device Controller Version Data 20663*b*1*e* is the version data representing the current version of Input Device Controller 20663OSe (FIG. 1511). LCD Controller Version Data 20663*b*1*f* is the version data representing the current version of LCD Controller 20663OSf (FIG. 1511). LED Controller Version Data 20663*b*1*g* is the version data representing the current version of LED Controller 20663OSg (FIG. 1511). Memory Card Interface Controller Version Data 20663*b*1*h* is the version data representing the current version of Memory Card Interface Controller 20663OSh (FIG. 1511). Microphone Controller Version Data 20663*b*1*i* is the version data representing the current version of Microphone Controller 20663OSi (FIG. 1511). Photometer Controller Version Data 20663*b*1*j* is the version data representing the current version of Photometer Controller 20663OSj (FIG. 1511). RAM Controller Version Data 20663*b*1*k* is the version data representing the current version of RAM Controller 20663OSk (FIG. 1511). ROM Controller Version Data 20663*b*1*l* is the version data representing the current version of ROM Controller 20663OSl (FIG. 1511). Signal Processor Controller Version Data 20663*b*1*m* is the version data representing the current version of Signal Processor Controller 20663OSm (FIG. 1512). Signal Processor Controller Version Data 20663*b*1*n* is the version data representing the current version of Signal Processor Controller 20663OSn (FIG. 1512). Solar Panel Controller Version Data 20663*b*10 is the version data representing the current version of Solar Panel Controller 20663OSo (FIG. 1512). Speaker Controller Version Data 20663*b*1*p* is the version data representing the current version of Speaker Controller 20663OSp (FIG. 1512). Vibrator Controller Version Data 20663*b*1*q* is the version data representing the current version of Vibrator Controller 20663OSq (FIG. 1512). Video Processor Controller Version Data 20663*b*1*r* is the version data representing the current version of Video Processor Controller 20663OSr (FIG. 1512). Wireless Receiver Controller Version Data 20663*b*1*s* is the version data representing the current version of Wireless Receiver Controller 20663OSs (FIG. 1512). Wireless Receiver Controller Version Data 20663*b*1*t* is the version data representing the current version of Wireless Receiver Controller 20663OSt (FIG. 1512). Wireless Receiver Controller Version Data 20663*b*1*u* is the version data representing the current version of Wireless Receiver Controller 20663OSu (FIG. 1512). Wireless Transmitter Controller Version Data 20663*b*1*v* is the version data representing the current version of Wireless Transmitter Controller 20663OSv (FIG. 1512). Wireless Transmitter Controller Version Data 20663*b*1*w* is the version data representing the current version of Wireless Transmitter Controller 20663OSw (FIG. 1512). Wireless Transmitter Controller Version Data 20663*b*1*x* is the version data representing the current version of Wireless Transmitter Controller 20663OSx (FIG. 1512). Here, the version data is composed of numeric data, such as '1', '2', and '3', wherein '1' represents version '1.0', '2' represents version '2.0', and '3' represents version '3.0'.

FIGS. 1517 and 1518 illustrate the software programs stored in OS Updating Software Storage Area 20663*c* (FIG. 1513). As described in the present drawing, OS Updating Software Storage Area 20663*c* stores Battery Controller Updating Software 20663*c*1*a*, CCD Unit Controller Updating Software 20663*c*1*b*, Flash Light Unit Controller Updating Software 20663*c*1*c*, Indicator Controller Updating Software 20663*c*1*d*, Input Device Controller Updating Software 20663*c*1*e*, LCD Controller Updating Software 20663*c*1*f*, LED Controller Updating Software 20663*c*1*g*, Memory Card Interface Controller Updating Software 20663*c*1*h*, Microphone Controller Updating Software 20663*c*1*i*, Photometer Controller Updating Software 20663*c*1*j*, RAM Controller Updating Software 20663*c*1*k*, ROM Controller Updating Software 20663*c*1*l*, Signal Processor Controller Updating Software 20663*c*1*m*, Signal Processor Controller Updating Software 20663*c*1*n*, Solar Panel Controller Updating Software 20663*c*1*o*, Speaker Controller Updating Software 20663*c*1*p*, Vibrator Controller Updating Software 20663*c*1*q*, Video Processor Controller Updating Software 20663*c*1*r*, Wireless Receiver Controller Updating Software 20663*c*1*s*, Wireless Receiver Controller Updating Software 20663*c*1*t*, Wireless Receiver Controller Updating Software 20663*c*1*u*, Wireless Transmitter Controller Updating Software 20663*c*1*v*, Wireless Transmitter Controller Updating Software 20663*c*1*w*, and Wireless Transmitter Controller Updating Software 20663*c*1*x*. Battery Controller Updating Software 20663*c*1*a* is the software program described in FIGS. 1528 and 1529. CCD Unit Controller Updating Software 20663*c*1*b* is the software program described in FIGS. 1530 and 1531. Flash Light Unit Controller Updating Software 20663*c*1*c* is the software program described in FIGS. 1532 and 1533. Indicator Controller Updating Software 20663*c*1*d* is the software program described in FIGS. 1534 and 1535. Input Device Controller Updating Software 20663*c*1*e* is the software program described in FIGS. 1536 and 1537. LCD Controller Updating Software 20663*c*1*f* is the software program described in FIGS. 1538 and 1539. LED Controller Updating Software 20663*c*1*g* is the software program described in FIGS. 1540 and 1541. Memory Card Interface Controller Updating Software 20663*c*1*h* is the software program described in FIGS. 1542 and 1543. Microphone Controller Updating Software 20663*c*1*i* is the software program described in FIGS. 1544 and 1545. Photometer Controller Updating Software 20663*c*1*j* is the software program described in FIGS. 1546 and 1547. RAM Controller Updating Software 20663*c*1*k* is the software program described in FIGS. 1548 and 1549. ROM Controller Updating Software 20663*c*1*l* is the software program described in FIGS. 1550 and 1551. Signal Processor Controller Updating Software 20663*c*1*m* is the software program described in FIGS. 1552 and 1553. Signal Processor Controller Updating Software 20663*c*1*n* is the software program described in FIGS. 1554 and 1555. Solar Panel Controller Updating Software 20663*c*10 is the software program described in FIGS. 1556 and 1557. Speaker Controller Updating Software 20663*c*1*p* is the software program described in FIGS. 1558 and 1559. Vibrator Controller Updating Software 20663*c*1*q* is the software program described in FIGS. 1560 and 1561. Video Processor Controller Updating Software 20663*c*1*r* is the software program described in FIGS. 1562 and 1563. Wireless Receiver Controller Updating Software 20663*c*1*s* is the software program described in FIGS. 1564 and 1565. Wireless Receiver Controller Updating Software 20663*c*1*t* is the software program described in FIGS. 1566 and 1567. Wireless Receiver Controller Updating Software 20663*c*1*u* is the software program described in FIGS. 1568 and 1569. Wireless Transmitter Controller Updating Software 20663*c*1*v* is the software program described in FIGS. 1570 and 1571. Wireless Transmitter Controller Updating Software 20663*c*1*w* is the software program described in FIGS. 1572 and 1573. Wireless Transmitter Controller Updating Software 20663*c*1*x* is the software program described in FIGS. 1574 and 1575.

FIG. 1519 illustrates the storage areas included in Host H (FIG. 429). As described in the present drawing, Host H includes Operating System H63OS of which the data stored therein are described in FIGS. 1520 and 1521, and OS Updating Information Storage Area H63*a* of which the data and the software programs stored therein are described in FIG. 1522.

FIGS. 1520 and 1521 illustrate the data stored in Operating System H63OS (FIG. 1519). As described in the present drawing, Operating System H63OS includes Battery Controller H63OSa, CCD Unit Controller H63OSb, Flash Light Unit Controller H63OSc, Indicator Controller H63OSd, Input Device Controller H63OSe, LCD Controller H63OSf, LED Controller H63OSg, Memory Card Interface Controller H63OSh, Microphone Controller H63OSi, Photometer Controller H63OSj, RAM Controller H63OSk, ROM Controller H63OSl, Signal Processor Controller H63OSm, Signal Processor Controller H63OSn, Solar Panel Controller H63OSo, Speaker Controller H63OSp, Vibrator Controller H63OSq, Video Processor Controller H63OSr, Wireless Receiver Controller H63OSs, Wireless Receiver Controller H63OSt, Wireless Receiver Controller H63OSu, Wireless Transmitter Controller H63OSv, Wireless Transmitter Controller H63OSw, and Wireless Transmitter Controller H63OSx. Battery Controller H63OSa is the controller of the latest version which controls Battery 230 (FIG. 467). CCD Unit Controller H63OSb is the controller of the latest version which controls CCD Unit 214 (FIG. 467). Flash Light Unit Controller H63OSc is the controller of the latest version which controls Flash Light Unit 220 (FIG. 467). Indicator Controller H63OSd is the controller of the latest version which controls Indicator 212 (FIG. 467). Input Device Controller H63OSe is the controller of the latest version which controls Input Device 210 (FIG. 467). LCD Controller H63OSf is the controller of the latest version which controls LCD 201 (FIG. 467). LED Controller H63OSg is the controller of the latest version which controls LED 219 (FIG. 467). Memory Card Interface Controller H63OSh is the controller of the latest version which controls Memory Card Interface 221 (FIG. 467). Microphone Controller H63OSi is the controller of the latest version which controls Microphone 215 (FIG. 467). Photometer Controller H63OSj is the controller of the latest version which controls Photometer 232 (FIG. 467). RAM Controller H63OSk is the controller of the latest version which controls Host H (FIG. 467). ROM Controller H63OSl is the controller of the latest version which controls ROM 207 (FIG. 467). Signal Processor Controller H63OSm is the controller of the latest version which controls Signal Processor 205 (FIG. 467). Signal Processor Controller H63OSn is the controller of the latest version which controls Signal Processor 208 (FIG. 467). Solar Panel Controller H63OSo is the controller of the latest version which controls Solar Panel 229 (FIG. 467). Speaker Controller H63OSp is the controller of the latest version which controls Speaker 216L (FIG. 467). Vibrator Controller H63OSq is the controller of the latest version which controls Vibrator 217 (FIG. 467). Video Processor Controller H63OSr is the controller of the latest version which controls Video Processor 202 (FIG. 467). Wireless Receiver Controller H63OSs is the controller of the latest version which controls Wireless Receiver 224 (FIG. 467). Wireless Receiver Controller H63OSt is the controller of the latest version which controls Wireless Receiver 225 (FIG. 467). Wireless Receiver Controller H63OSu is the controller of the latest version which controls Wireless Receiver 226 (FIG. 467). Wireless Transmitter Controller H63OSv is the controller of the latest version which controls Wireless Transmitter 222 (FIG. 467). Wireless Transmitter Controller H63OSw is the controller of the latest version which controls Wireless Transmitter 223 (FIG. 467). Wireless Transmitter Controller H63OSx is the controller of the latest version which controls Wireless Transmitter 227 (FIG. 467). The data stored in Operating System Storage Area H63OS are updated periodically. For the avoidance of doubt, the data stored in Operating System H63OS are illustrative, and other types of data, which are utilized to update Operating System H63OS of Communication Device 200 by implementing the present function, are also stored therein, such as DLLs, drivers, security implementing program. The data stored in Operating System H63OS are updated periodically thereby the data are always of the latest version.

FIG. 1522 illustrates the storage areas included in OS Updating Information Storage Area H63*a* (FIG. 1519). As described in the present drawing, OS Updating Information Storage Area H63*a* includes OS Updating Data Storage Area H63*b* and OS Updating Software Storage Area H63*c*. OS Updating Data Storage Area H63*b* stores the data necessary to implement the present function on the side of Host H (FIG. 429), such as the ones described in FIG. 1523. OS Updating Software Storage Area H63*c* stores the software programs necessary to implement the present function on the side of Host H, such as the ones described in FIGS. 1526 and 1527.

FIG. 1523 illustrates the storage area included in OS Updating Data Storage Area H63*b* (FIG. 1522). As described in the present drawing, OS Updating Data Storage Area H63*b* includes OS Version Data Storage Area H63*b*1. OS Version Data Storage Area H63*b*1 stores the data described in FIGS. 1524 and 1525.

FIGS. 1524 and 1525 illustrate the data stored in OS Version Data Storage Area H63*b*1 (FIG. 1523). As described in the present drawing, OS Version Data Storage Area H63*b*1 includes Battery Controller Version Data H63*b*1*a*, CCD Unit Controller Version Data H63*b*1*b*, Flash Light Unit Controller Version Data H63*b*1*c*, Indicator Controller Version Data H63*b*1*d*, Input Device Controller Version Data H63*b*1*e*, LCD Controller Version Data H63*b*1*f*, LED Controller Version Data H63*b*1*g*, Memory Card Interface Controller Version Data H63*b*1*h*, Microphone Controller Version Data H63*b*1*i*, Photometer Controller Version Data H63*b*1*j*, RAM Controller Version Data H63*b*1*k*, ROM Controller Version Data H63*b*1*l*, Signal Processor Controller Version Data H63*b*1*m*, Signal Processor Controller Version Data H63*b*1*n*, Solar Panel Controller Version Data H63*b*1*o*, Speaker Controller Version Data H63*b*1*p*, Vibrator Controller Version Data H63*b*1*q*, Video Processor Controller Version Data H63*b*1*r*, Wireless Receiver Controller Version Data H63*b*1*s*, Wireless Receiver Controller Version Data H63*b*1*t*, Wireless Receiver Controller Version Data H63*b*1*u*, Wireless Transmitter Controller Version Data H63*b*1*v*, Wireless Transmitter Controller Version Data H63*b*1*w*, and Wireless Transmitter Controller Version Data H63*b*1*x*. Battery Controller Version Data H63*b*1*a* is the version data representing the latest version of Battery Controller H63OSa (FIG. 1520). CCD Unit Controller Version Data H63*b*1*b* is the version data representing the latest version of CCD Unit Controller H63OSb (FIG. 1520). Flash Light Unit Controller Version Data H63*b*1*c* is the version data representing the latest version of Flash Light Unit Controller H63OSc (FIG. 1520). Indicator Controller Version Data H63*b*1*d* is the version data representing the latest version of Indicator Controller H63OSd (FIG. 1520). Input Device Controller Version Data H63*b*1*e* is the version data representing the latest version of Input Device Controller H63OSe (FIG. 1520). LCD Controller Version Data H63*b*1*f* is the version data representing the latest version of LCD Controller H63OSf (FIG. 1520). LED Controller Version Data H63*b*1*g* is the version data representing the latest version of LED Controller H63OSg (FIG. 1520). Memory Card Interface Controller Version Data H63*b*1*h* is the version data representing the latest version of Memory Card Interface Controller H63OSh (FIG. 1520). Microphone Controller Version Data H63*b*1*i* is the version data representing the latest version of Microphone Controller H63OSi (FIG. 1520). Photometer Controller Version Data H63*b*1*j* is the version data representing the latest version of Photometer Controller H63OSj (FIG. 1520). RAM Controller Version Data H63*b*1*k* is the version data representing the latest version of RAM Controller H63OSk (FIG. 1520). ROM Controller Version Data H63*b*1*l* is the version data representing the latest version of ROM Controller H63OSl (FIG. 1520). Signal Processor Controller Version Data H63*b*1*m* is the version data representing the latest version of Signal Processor Controller H63OSm (FIG. 1521). Signal Processor Controller Version Data H63*b*1*n* is the version data representing the latest version of Signal Processor Controller H63OSn (FIG. 1521). Solar Panel Controller Version Data H63*b*1*o* is the version data representing the latest version of Solar Panel Controller H63OSo (FIG. 1521). Speaker Controller Version Data H63*b*1*p* is the version data representing the latest version of Speaker Controller H63OSp (FIG. 1521). Vibrator Controller Version Data H63*b*1*q* is the version data representing the latest version of Vibrator Controller H63OSq (FIG. 1521). Video Processor Controller Version Data H63*b*1*r* is the version data representing the latest version of Video Processor Controller H63OSr (FIG. 1521). Wireless Receiver Controller Version Data H63*b*1*s* is the version data representing the latest version of Wireless Receiver Controller H63OSs (FIG. 1521). Wireless Receiver Controller Version Data H63*b*1*t* is the version data representing the latest version of Wireless Receiver Controller H63OSt (FIG. 1521). Wireless Receiver Controller Version Data H63*b*1*u* is the version data representing the latest version of Wireless Receiver Controller H63OSu (FIG. 1521). Wireless Transmitter Controller Version Data H63*b*1*v* is the version data representing the latest version of Wireless Transmitter Controller H63OSv (FIG. 1521). Wireless Transmitter Controller Version Data H63*b*1*w* is the version data representing the latest version of Wireless Transmitter Controller H63OSw (FIG. 1521). Wireless Transmitter Controller Version Data H63*b*1*x* is the version data representing the latest version of Wireless Transmitter Controller H63OSx (FIG. 1521). Here, the version data is composed of numeric data, such as '1', '2', and '3', wherein '1' represents version '1.0', '2' represents version '2.0', and '3' represents version '3.0'. The data stored in OS Version Data Storage Area H63*b*1 are updated periodically.

FIGS. 1526 and 1527 illustrate the software programs stored in OS Updating Software Storage Area H63*c* (FIG. 1522). As described in the present drawing, OS Updating Software Storage Area H63*c* stores Battery Controller Updating Software H63*c*1*a*, CCD Unit Controller Updating Software H63*c*1*b*, Flash Light Unit Controller Updating Software H63*c*1*c*, Indicator Controller Updating Software H63*c*1*d*, Input Device Controller Updating Software H63*c*1*e*, LCD Controller Updating Software H63*c*1*f*, LED Controller Updating Software H63*c*1*g*, Memory Card Interface Controller Updating Software H63*c*1*h*, Microphone Controller Updating Software H63*c*1*i*, Photometer Controller Updating Software H63*c*1*j*, RAM Controller Updating Software H63*c*1*k*, ROM Controller Updating Software H63*c*1*l*, Signal Processor Controller Updating Software H63*c*1*m*, Signal Processor Controller Updating Software H63*c*1*n*, Solar Panel Controller Updating Software H63*c*1*o*, Speaker Controller Updating Software H63*c*1*p*, Vibrator Controller Updating Software H63*c*1*q*, Video Processor Controller Updating Software H63*c*1*r*, Wireless Receiver Controller Updating Software H63*c*1*s*, Wireless Receiver Controller Updating Software H63*c*1*t*, Wireless Receiver Controller Updating Software H63*c*1*u*, Wireless Transmitter Controller Updating Software H63*c*1*v*, Wireless Transmitter Controller Updating Software H63*c*1*w*, and Wireless Transmitter Controller Updating Software H63*c*1*x*. Battery Controller Updating Software H63*c*1*a* is the software program described in FIGS. 1528 and 1529. CCD Unit Controller Updating Software H63*c*1*b* is the software program described in FIGS. 1530 and 1531. Flash Light Unit Controller Updating Software H63*c*1*c* is the software program described in FIGS. 1532 and 1533. Indicator Controller Updating Software H63*c*1*d* is the software program described in FIGS. 1534 and 1535. Input Device Controller Updating Software H63*c*1*e* is the software program described in FIGS. 1536 and 1537. LCD Controller Updating Software H63*c*1*f* is the software program described in FIGS. 1538 and 1539. LED Controller Updating Software H63*c*1*g* is the software program described in FIGS. 1540 and 1541. Memory Card Interface Controller Updating Software H63*c*1*h* is the software program described in FIGS. 1542 and 1543. Microphone Controller Updating Software H63*c*1*i* is the software program described in FIGS. 1544 and 1545. Photometer Controller Updating Software H63*c*1*j* is the software program described in FIGS. 1546 and 1547. RAM Controller Updating Software H63*c*1*k* is the software program described in FIGS. 1548 and 1549. ROM Controller Updating Software H63*c*1*l* is the software program described in FIGS. 1550 and 1551. Signal Processor Controller Updating Software H63*c*1*m* is the software program described in FIGS. 1552 and 1553. Signal Processor Controller Updating Software H63*c*1*n* is the software program described in FIGS. 1554 and 1555. Solar Panel Controller Updating Software H63*c*1*o* is the software program described in FIGS. 1556 and 1557. Speaker Controller Updating Software H63*c*1*p* is the software program described in FIGS. 1558 and 1559. Vibrator Controller Updating Software H63*c*1*q* is the software program described in FIGS. 1560 and 1561. Video Processor Controller Updating Software H63*c*1*r* is the software program described in FIGS. 1562 and 1563. Wireless Receiver Controller Updating Software H63*c*1*s* is the software program described in FIGS. 1564 and 1565. Wireless Receiver Controller Updating Software H63*c*1*t* is the software program described in FIGS. 1566 and 1567. Wireless Receiver Controller Updating Software H63*c*1*u* is the software program described in FIGS. 1568 and 1569. Wireless Transmitter Controller Updating Software H63*c*1*v* is the software program described in FIGS. 1570 and 1571. Wireless Transmitter Controller Updating Software H63*c*1*w* is the software program described in FIGS. 1572 and 1573. Wireless Transmitter Controller Updating Software H63*c*1*x* is the software program described in FIGS. 1574 and 1575. The foregoing software programs are automatically implemented periodically or implemented manually by utilizing Input Device 210 (FIG. 1) or via voice recognition system.

FIG. 1528 illustrates Battery Controller Updating Software H63*c*1*a* (FIG. 1526) of Host H (FIG. 429) and Battery Controller Updating Software 20663*c*1*a* (FIG. 1517) of Communication Device 200, which update Battery Controller 20663OSa stored in Operating System 20663OS (FIG. 1511) of Communication Device 200. As described in the present drawing, CPU 211 (FIG. 1) of Communication Device 200 retrieves Battery Controller Version Data 20663*b*1*a* from OS Version Data Storage Area 20663*b*1 (FIG. 1515) and sends the data to Host H (S1). Upon receiving Battery Controller Version Data 20663*b*1*a* (FIG. 1515) from Communication Device 200 (S2), Host H compares Battery Controller Version Data 20663*b*1*a* (FIG. 1515) with Battery Controller Version Data H63*b*1*a* stored in OS Version Data Storage Area H63*b*1 (FIG. 1524) of Host H (S3). Assuming that Host H detects in S3 that Battery Controller Version Data 20663*b*1*a* of Communication Device 200 is of an old version. Host H retrieves Battery Controller H63OSa, which is of the latest version, from Operating System Storage Area H63OS (FIG. 1520), and sends the controller to Communication Device 200 (S4). Upon receiving Battery Controller H63OSa from Host H (S5), CPU 211 stores Battery Controller H63OSa as Battery Controller 20663OSa in Operating System 20663OS (FIG. 1511) (S6). The old version of Battery Controller 20663OSa (FIG. 1511) is deleted.

FIG. 1529 illustrates another embodiment of Battery Controller Updating Software H63*c*1*a* (FIG. 1526) of Host H (FIG. 429) and Battery Controller Updating Software 20663*c*1*a* (FIG. 1517) of Communication Device 200, which update Battery Controller 20663OSa stored in Operating System 20663OS (FIG. 1511) of Communication Device 200. As described in the present drawing, CPU 211 (FIG. 1) of Communication Device 200 sends a Battery Controller Update Request, which is received by Host H (S1). Here, the Battery Controller Update Request is a request to send Battery Controller Version Data H63*b*1*a* (FIG. 1524) stored in Host H to Communication Device 200. In response to the request, Host H retrieves Battery Controller Version Data H63*b*1*a* from OS Version Data Storage Area H63*b*1 (FIG. 1524), and sends the data to Communication Device 200 (S2). Upon receiving Battery Controller Version Data H63*b*1*a* from Host H (S3), CPU 211 compares Battery Controller Version Data H63*b*1*a* with Battery Controller Version Data 20663*b*1*a* stored in OS Version Data Storage Area 20663*b*1 (FIG. 1515) of Communication Device 200 (S4). Assuming that CPU211 detects in S4 that Battery Controller Version Data 20663*b*1*a* of Communication Device 200 is of an old version. CPU 211 sends a New Battery Controller Sending Request, which is received by Host H (S5). Here, the New Battery Controller Sending Request is a request to send Battery Controller H63OSa (FIG. 1520) stored in Host H to Communication Device 200. Host H retrieves Battery Controller H63OSa (FIG. 1520), which is of the latest version, from Operating System Storage Area H63OS (FIG. 1520), and sends the controller to Communication Device 200 (S6). Upon receiving Battery Controller H63OSa from Host H (S7), CPU 211 stores Battery Controller H63OSa as Battery Controller 20663OSa in Operating System 20663OS (FIG. 1511) (S8). The old version of Battery Controller 20663OSa (FIG. 1511) is deleted.

FIG. 1530 illustrates CCD Unit Controller Updating Software H63*c*1*b* (FIG. 1526) of Host H (FIG. 429) and CCD Unit Controller Updating Software 20663*c*1*b* (FIG. 1517) of Communication Device 200, which update CCD Unit Controller 20663OSb stored in Operating System 20663OS (FIG. 1511) of Communication Device 200. As described in the present drawing, CPU 211 (FIG. 1) of Communication Device 200 retrieves CCD Unit Controller Version Data 20663*b*1*b* from OS Version Data Storage Area 20663*b*1 (FIG. 1515) and sends the data to Host H (S1). Upon receiving CCD Unit Controller Version Data 20663*b*1*b* (FIG. 1515) from Communication Device 200 (S2), Host H compares CCD Unit Controller Version Data 20663*b*1*b* (FIG. 1515) with CCD Unit Controller Version Data H63*b*1*b* stored in OS Version Data Storage Area H63*b*1 (FIG. 1524) of Host H (S3). Assuming that Host H detects in S3 that CCD Unit Controller Version Data 20663*b*1*b* of Communication Device 200 is of an old version. Host H retrieves CCD Unit Controller H63OSb, which is of the latest version, from Operating System Storage Area H63OS (FIG. 1520), and sends the controller to Communication Device 200 (S4). Upon receiving CCD Unit Controller H63OSb from Host H (S5), CPU 211 stores CCD Unit Controller H63OSb as CCD Unit Controller 20663OSb in Operating System 20663OS (FIG. 1511) (S6). The old version of CCD Unit Controller 20663OSb (FIG. 1511) is deleted.

FIG. 1531 illustrates another embodiment of CCD Unit Controller Updating Software H63*c*1*b* (FIG. 1526) of Host H (FIG. 429) and CCD Unit Controller Updating Software 20663*c*1*b* (FIG. 1517) of Communication Device 200, which update CCD Unit Controller 20663OSb stored in Operating System 20663OS (FIG. 1511) of Communication Device 200. As described in the present drawing, CPU 211 (FIG. 1) of Communication Device 200 sends a CCD Unit Controller Update Request, which is received by Host H (S1). Here, the CCD Unit Controller Update Request is a request to send CCD Unit Controller Version Data H63*b*1*b* (FIG. 1524) stored in Host H to Communication Device 200. In response to the request, Host H retrieves CCD Unit Controller Version Data H63*b*1*b* from OS Version Data Storage Area H63*b*1 (FIG. 1524), and sends the data to Communication Device 200 (S2). Upon receiving CCD Unit Controller Version Data H63*b*1*b* from Host H (S3), CPU 211 compares CCD Unit Controller Version Data H63*b*1*b* with CCD Unit Controller Version Data 20663*b*1*b* stored in OS Version Data Storage Area 20663*b*1 (FIG. 1515) of Communication Device 200 (S4). Assuming that CPU211 detects in S4 that CCD Unit Controller Version Data 20663*b*1*b* of Communication Device 200 is of an old version. CPU 211 sends a New CCD Unit Controller Sending Request, which is received by Host H (S5). Here, the New CCD Unit Controller Sending Request is a request to send CCD Unit Controller H63OSb (FIG. 1520) stored in Host H to Communication Device 200. Host H retrieves CCD Unit Controller H63OSb (FIG. 1520), which is of the latest version, from Operating System Storage Area H63OS (FIG. 1520), and sends the controller to Communication Device 200 (S6). Upon receiving CCD Unit Controller H63OSb from Host H (S7), CPU 211 stores CCD Unit Controller H63OSb as CCD Unit Controller 20663OSb in Operating System 20663OS (FIG. 1511) (S8). The old version of CCD Unit Controller 20663OSb (FIG. 1511) is deleted.

FIG. 1532 illustrates Flash Light Unit Controller Updating Software H63*c*1*c* (FIG. 1526) of Host H (FIG. 429) and Flash Light Unit Controller Updating Software 20663*c*1*c* (FIG. 1517) of Communication Device 200, which update Flash Light Unit Controller 20663OSc stored in Operating System 20663OS (FIG. 1511) of Communication Device 200. As described in the present drawing, CPU 211 (FIG. 1) of Communication Device 200 retrieves Flash Light Unit Controller Version Data 20663*b*1*c* from OS Version Data Storage Area 20663*b*1 (FIG. 1515) and sends the data to Host H (S1). Upon receiving Flash Light Unit Controller Version Data 20663*b*1*c* (FIG. 1515) from Communication Device 200 (S2), Host H compares Flash Light Unit Controller Version Data 20663*b*1*c* (FIG. 1515) with Flash Light Unit Controller Version Data H63*b*1*c* stored in OS Version Data Storage Area H63*b*1 (FIG. 1524) of Host H (S3). Assuming that Host H detects in S3 that Flash Light Unit Controller Version Data 20663*b*1*c* of Communication Device 200 is of an old version. Host H retrieves Flash Light Unit Controller H63OSc, which is of the latest version, from Operating System Storage Area H63OS (FIG. 1520), and sends the controller to Communication Device 200 (S4). Upon receiving Flash Light Unit Controller H63OSc from Host H (S5), CPU 211 stores Flash Light Unit Controller H63OSc as Flash Light Unit Controller 20663OSc in Operating System 20663OS (FIG. 1511) (S6). The old version of Flash Light Unit Controller 20663OSc (FIG. 1511) is deleted.

FIG. 1533 illustrates another embodiment of Flash Light Unit Controller Updating Software H63*c*1*c* (FIG. 1526) of Host H (FIG. 429) and Flash Light Unit Controller Updating Software 20663*c*1*c* (FIG. 1517) of Communication Device 200, which update Flash Light Unit Controller 20663OSc stored in Operating System 20663OS (FIG. 1511) of Communication Device 200. As described in the present drawing, CPU 211 (FIG. 1) of Communication Device 200 sends a Flash Light Unit Controller Update Request, which is received by Host H (S1). Here, the Flash Light Unit Controller Update Request is a request to send Flash Light Unit Controller Version Data H63*b*1*c* (FIG. 1524) stored in Host H to Communication Device 200. In response to the request, Host H retrieves Flash Light Unit Controller Version Data H63*b*1*c* from OS Version Data Storage Area H63*b*1 (FIG. 1524), and sends the data to Communication Device 200 (S2). Upon receiving Flash Light Unit Controller Version Data H63*b*1*c* from Host H (S3), CPU 211 compares Flash Light Unit Controller Version Data H63*b*1*c* with Flash Light Unit Controller Version Data 20663*b*1*c* stored in OS Version Data Storage Area 20663*b*1 (FIG. 1515) of Communication Device 200 (S4). Assuming that CPU211 detects in S4 that Flash Light Unit Controller Version Data 20663*b*1*c* of Communication Device 200 is of an old version. CPU 211 sends a New Flash Light Unit Controller Sending Request, which is received by Host H (S5). Here, the New Flash Light Unit Controller Sending Request is a request to send Flash Light Unit Controller H63OSc (FIG. 1520) stored in Host H to Communication Device 200. Host H retrieves Flash Light Unit Controller H63OSc (FIG. 1520), which is of the latest version, from Operating System Storage Area H63OS (FIG. 1520), and sends the controller to Communication Device 200 (S6). Upon receiving Flash Light Unit Controller H63OSc from Host H (S7), CPU 211 stores Flash Light Unit Controller H63OSc as Flash Light Unit Controller 20663OSc in Operating System 20663OS (FIG. 1511) (S8). The old version of Flash Light Unit Controller 20663OSc (FIG. 1511) is deleted.

FIG. 1534 illustrates Indicator Controller Updating Software H63*c*1*d* (FIG. 1526) of Host H (FIG. 429) and Indicator Controller Updating Software 20663*c*1*d* (FIG. 1517) of Communication Device 200, which update Indicator Controller 20663OSd stored in Operating System 20663OS (FIG. 1511) of Communication Device 200. As described in the present drawing, CPU 211 (FIG. 1) of Communication Device 200 retrieves Indicator Controller Version Data

**20663*b*1*d* from OS Version Data Storage Area 20663*b*1 (FIG. 1515) and sends the data to Host H (S1). Upon receiving Indicator Controller Version Data 20663*b*1*d* (FIG. 1515) from Communication Device 200 (S2), Host H compares Indicator Controller Version Data 20663*b*1*d* (FIG. 1515) with Indicator Controller Version Data H63*b*1*d* stored in OS Version Data Storage Area H63*b*1 (FIG. 1524) of Host H (S3). Assuming that Host H detects in S3 that Indicator Controller Version Data 20663*b*1*d* of Communication Device 200 is of an old version. Host H retrieves Indicator Controller H63OSd, which is of the latest version, from Operating System Storage Area H63OS (FIG. 1520), and sends the controller to Communication Device 200 (S4). Upon receiving Indicator Controller H63OSd from Host H (S5), CPU 211 stores Indicator Controller H63OSd as Indicator Controller 20663OSd in Operating System 20663OS (FIG. 1511) (S6). The old version of Indicator Controller 20663OSd (FIG. 1511**) is deleted.

FIG. 1535 illustrates another embodiment of Indicator Controller Updating Software H**63*c*1*d* (FIG. 1526) of Host H (FIG. 429) and Indicator Controller Updating Software 20663*c*1*d* (FIG. 1517) of Communication Device 200, which update Indicator Controller 20663OSd stored in Operating System 20663OS (FIG. 1511) of Communication Device 200. As described in the present drawing, CPU 211 (FIG. 1) of Communication Device 200 sends a Indicator Controller Update Request, which is received by Host H (S1). Here, the Indicator Controller Update Request is a request to send Indicator Controller Version Data H63*b*1*d* (FIG. 1524) stored in Host H to Communication Device 200. In response to the request, Host H retrieves Indicator Controller Version Data H63*b*1*d* from OS Version Data Storage Area H63*b*1 (FIG. 1524), and sends the data to Communication Device 200 (S2). Upon receiving Indicator Controller Version Data H63*b*1*d* from Host H (S3), CPU 211 compares Indicator Controller Version Data H63*b*1*d* with Indicator Controller Version Data 20663*b*1*d* stored in OS Version Data Storage Area 20663*b*1 (FIG. 1515) of Communication Device 200 (S4). Assuming that CPU211 detects in S4 that Indicator Controller Version Data 20663*b*1*d* of Communication Device 200 is of an old version. CPU 211 sends a New Indicator Controller Sending Request, which is received by Host H (S5). Here, the New Indicator Controller Sending Request is a request to send Indicator Controller H63OSd (FIG. 1520) stored in Host H to Communication Device 200. Host H retrieves Indicator Controller H63OSd (FIG. 1520), which is of the latest version, from Operating System Storage Area H63OS (FIG. 1520), and sends the controller to Communication Device 200 (S6). Upon receiving Indicator Controller H63OSd from Host H (S7), CPU 211 stores Indicator Controller H63OSd as Indicator Controller 20663OSd in Operating System 20663OS (FIG. 1511) (S8). The old version of Indicator Controller 20663OSd (FIG. 1511**) is deleted.

FIG. 1536 illustrates Input Device Controller Updating Software H**63*c*1*e* (FIG. 1526) of Host H (FIG. 429) and Input Device Controller Updating Software 20663*c*1*e* (FIG. 1517) of Communication Device 200, which update Input Device Controller 20663OSe stored in Operating System 20663OS (FIG. 1511) of Communication Device 200. As described in the present drawing, CPU 211 (FIG. 1) of Communication Device 200 retrieves Input Device Controller Version Data 20663*b*1*e* from OS Version Data Storage Area 20663*b*1 (FIG. 1515) and sends the data to Host H (S1). Upon receiving Input Device Controller Version Data 20663*b*1*e* (FIG. 1515) from Communication Device 200 (S2), Host H compares Input Device Controller Version Data 20663*b*1*e* (FIG. 1515) with Input Device Controller Version Data H63*b*1*e* stored in OS Version Data Storage Area H63*b*1 (FIG. 1524) of Host H (S3). Assuming that Host H detects in S3 that Input Device Controller Version Data 20663*b*1*e* of Communication Device 200 is of an old version. Host H retrieves Input Device Controller H63OSe, which is of the latest version, from Operating System Storage Area H63OS (FIG. 1520), and sends the controller to Communication Device 200 (S4). Upon receiving Input Device Controller H63OSe from Host H (S5), CPU 211 stores Input Device Controller H63OSe as Input Device Controller 20663OSe in Operating System 20663OS (FIG. 1511) (S6). The old version of Input Device Controller 20663OSe (FIG. 1511**) is deleted.

FIG. 1537 illustrates another embodiment of Input Device Controller Updating Software H**63*c*1*e* (FIG. 1526) of Host H (FIG. 429) and Input Device Controller Updating Software 20663*c*1*e* (FIG. 1517) of Communication Device 200, which update Input Device Controller 20663OSe stored in Operating System 20663OS (FIG. 1511) of Communication Device 200. As described in the present drawing, CPU 211 (FIG. 1) of Communication Device 200 sends a Input Device Controller Update Request, which is received by Host H (S1). Here, the Input Device Controller Update Request is a request to send Input Device Controller Version Data H63*b*1*e* (FIG. 1524) stored in Host H to Communication Device 200. In response to the request, Host H retrieves Input Device Controller Version Data H63*b*1*e* from OS Version Data Storage Area H63*b*1 (FIG. 1524), and sends the data to Communication Device 200 (S2). Upon receiving Input Device Controller Version Data H63*b*1*e* from Host H (S3), CPU 211 compares Input Device Controller Version Data H63*b*1*e* with Input Device Controller Version Data 20663*b*1*e* stored in OS Version Data Storage Area 20663*b*1 (FIG. 1515) of Communication Device 200 (S4). Assuming that CPU211 detects in S4 that Input Device Controller Version Data 20663*b*1*e* of Communication Device 200 is of an old version. CPU 211 sends a New Input Device Controller Sending Request, which is received by Host H (S5). Here, the New Input Device Controller Sending Request is a request to send Input Device Controller H63OSe (FIG. 1520) stored in Host H to Communication Device 200. Host H retrieves Input Device Controller H63OSe (FIG. 1520), which is of the latest version, from Operating System Storage Area H63OS (FIG. 1520), and sends the controller to Communication Device 200 (S6). Upon receiving Input Device Controller H63OSe from Host H (S7), CPU 211 stores Input Device Controller H63OSe as Input Device Controller 20663OSe in Operating System 20663OS (FIG. 1511) (S8). The old version of Input Device Controller 20663OSe (FIG. 1511**) is deleted.

FIG. 1538 illustrates LCD Controller Updating Software H**63*c*1*f* (FIG. 1526) of Host H (FIG. 429) and LCD Controller Updating Software 20663*c*1*f* (FIG. 1517) of Communication Device 200, which update LCD Controller 20663OSf stored in Operating System 20663OS (FIG. 1511) of Communication Device 200. As described in the present drawing, CPU 211 (FIG. 1) of Communication Device 200 retrieves LCD Controller Version Data 20663*b*1*f* from OS Version Data Storage Area 20663*b*1 (FIG. 1515) and sends the data to Host H (S1). Upon receiving LCD Controller Version Data 20663*b*1*f* (FIG. 1515) from Communication Device 200 (S2), Host H compares LCD Controller Version Data 20663*b*1*f* (FIG. 1515) with LCD Controller Version Data H63*b*1*f* stored in OS Version Data Storage Area H63*b*1 (FIG. 1524) of Host H (S3). Assuming that Host H detects in S3 that LCD Controller Version Data 20663*b*1*f* of Communication Device 200 is of an old version. Host H retrieves LCD Controller H63OSf, which is of the latest version, from Operating System Storage Area H63OS (FIG. 1520), and sends the controller to Communication Device 200 (S4). Upon receiving LCD Controller H63OSf from Host H (S5), CPU 211 stores LCD Controller H63OSf as LCD Controller 20663OSf in Operating System 20663OS (FIG. 1511) (S6). The old version of LCD Controller 20663OSf (FIG. 1511**) is deleted.

FIG. 1539 illustrates another embodiment of LCD Controller Updating Software H63*c*1*f* (FIG. 1526) of Host H (FIG. 429) and LCD Controller Updating Software 20663*c*1*f* (FIG. 1517) of Communication Device 200, which update LCD Controller 20663OSf stored in Operating System 20663OS (FIG. 1511) of Communication Device 200. As described in the present drawing, CPU 211 (FIG. 1) of Communication Device 200 sends a LCD Controller Update Request, which is received by Host H (S1). Here, the LCD Controller Update Request is a request to send LCD Controller Version Data H63*b*1*f* (FIG. 1524) stored in Host H to Communication Device 200. In response to the request, Host H retrieves LCD Controller Version Data H63*b*1*f* from OS Version Data Storage Area H63*b*1 (FIG. 1524), and sends the data to Communication Device 200 (S2). Upon receiving LCD Controller Version Data H63*b*1*f* from Host H (S3), CPU 211 compares LCD Controller Version Data H63*b*1*f* with LCD Controller Version Data 20663*b*1*f* stored in OS Version Data Storage Area 20663*b*1 (FIG. 1515) of Communication Device 200 (S4). Assuming that CPU211 detects in S4 that LCD Controller Version Data 20663*b*1*f* of Communication Device 200 is of an old version. CPU 211 sends a New LCD Controller Sending Request, which is received by Host H (S5). Here, the New LCD Controller Sending Request is a request to send LCD Controller H63OSf (FIG. 1520) stored in Host H to Communication Device 200. Host H retrieves LCD Controller H63OSf (FIG. 1520), which is of the latest version, from Operating System Storage Area H63OS (FIG. 1520), and sends the controller to Communication Device 200 (S6). Upon receiving LCD Controller H63OSf from Host H (S7), CPU 211 stores LCD Controller H63OSf as LCD Controller 20663OSf in Operating System 20663OS (FIG. 1511) (S8). The old version of LCD Controller 20663OSf (FIG. 1511) is deleted.

FIG. 1540 illustrates LED Controller Updating Software H63*c*1*g* (FIG. 1526) of Host H (FIG. 429) and LED Controller Updating Software 20663*c*1*g* (FIG. 1517) of Communication Device 200, which update LED Controller 20663OSg stored in Operating System 20663OS (FIG. 1511) of Communication Device 200. As described in the present drawing, CPU 211 (FIG. 1) of Communication Device 200 retrieves LED Controller Version Data 20663*b*1*g* from OS Version Data Storage Area 20663*b*1 (FIG. 1515) and sends the data to Host H (S1). Upon receiving LED Controller Version Data 20663*b*1*g* (FIG. 1515) from Communication Device 200 (S2), Host H compares LED Controller Version Data 20663*b*1*g* (FIG. 1515) with LED Controller Version Data H63*b*1*g* stored in OS Version Data Storage Area H63*b*1 (FIG. 1524) of Host H (S3). Assuming that Host H detects in S3 that LED Controller Version Data 20663*b*1*g* of Communication Device 200 is of an old version. Host H retrieves LED Controller H63OSg, which is of the latest version, from Operating System Storage Area H63OS (FIG. 1520), and sends the controller to Communication Device 200 (S4). Upon receiving LED Controller H63OSg from Host H (S5), CPU 211 stores LED Controller H63OSg as LED Controller 20663OSg in Operating System 20663OS (FIG. 1511) (S6). The old version of LED Controller 20663OSg (FIG. 1511) is deleted.

FIG. 1541 illustrates another embodiment of LED Controller Updating Software H63*c*1*g* (FIG. 1526) of Host H (FIG. 429) and LED Controller Updating Software 20663*c*1*g* (FIG. 1517) of Communication Device 200, which update LED Controller 20663OSg stored in Operating System 20663OS (FIG. 1511) of Communication Device 200. As described in the present drawing, CPU 211 (FIG. 1) of Communication Device 200 sends a LED Controller Update Request, which is received by Host H (S1). Here, the LED Controller Update Request is a request to send LED Controller Version Data H63*b*1*g* (FIG. 1524) stored in Host H to Communication Device 200. In response to the request, Host H retrieves LED Controller Version Data H63*b*1*g* from OS Version Data Storage Area H63*b*1 (FIG. 1524), and sends the data to Communication Device 200 (S2). Upon receiving LED Controller Version Data H63*b*1*g* from Host H (S3), CPU 211 compares LED Controller Version Data H63*b*1*g* with LED Controller Version Data 20663*b*1*g* stored in OS Version Data Storage Area 20663*b*1 (FIG. 1515) of Communication Device 200 (S4). Assuming that CPU211 detects in S4 that LED Controller Version Data 20663*b*1*g* of Communication Device 200 is of an old version. CPU 211 sends a New LED Controller Sending Request, which is received by Host H (S5). Here, the New LED Controller Sending Request is a request to send LED Controller H63OSg (FIG. 1520) stored in Host H to Communication Device 200. Host H retrieves LED Controller H63OSg (FIG. 1520), which is of the latest version, from Operating System Storage Area H63OS (FIG. 1520), and sends the controller to Communication Device 200 (S6). Upon receiving LED Controller H63OSg from Host H (S7), CPU 211 stores LED Controller H63OSg as LED Controller 20663OSg in Operating System 20663OS (FIG. 1511) (S8). The old version of LED Controller 20663OSg (FIG. 1511) is deleted.

FIG. 1542 illustrates Memory Card Interface Controller Updating Software H63*c*1*h* (FIG. 1526) of Host H (FIG. 429) and Memory Card Interface Controller Updating Software 20663*c*1*h* (FIG. 1517) of Communication Device 200, which update Memory Card Interface Controller 20663OSh stored in Operating System 20663OS (FIG. 1511) of Communication Device 200. As described in the present drawing, CPU 211 (FIG. 1) of Communication Device 200 retrieves Memory Card Interface Controller Version Data 20663*b*1*h* from OS Version Data Storage Area 20663*b*1 (FIG. 1515) and sends the data to Host H (S1). Upon receiving Memory Card Interface Controller Version Data 20663*b*1*h* (FIG. 1515) from Communication Device 200 (S2), Host H compares Memory Card Interface Controller Version Data 20663*b*1*h* (FIG. 1515) with Memory Card Interface Controller Version Data H63*b*1*h* stored in OS Version Data Storage Area H63*b*1 (FIG. 1524) of Host H (S3). Assuming that Host H detects in S3 that Memory Card Interface Controller Version Data 20663*b*1*h* of Communication Device 200 is of an old version. Host H retrieves Memory Card Interface Controller H63OSh, which is of the latest version, from Operating System Storage Area H63OS (FIG. 1520), and sends the controller to Communication Device 200 (S4). Upon receiving Memory Card Interface Controller H63OSh from Host H (S5), CPU 211 stores Memory Card Interface Controller H63OSh as Memory Card Interface Controller 20663OSh in Operating System 20663OS (FIG. 1511) (S6). The old version of Memory Card Interface Controller 20663OSh (FIG. 1511) is deleted.

FIG. 1543 illustrates another embodiment of Memory Card Interface Controller Updating Software H63*c*1*h* (FIG. 1526) of Host H (FIG. 429) and Memory Card Interface Controller Updating Software 20663*c*1*h* (FIG. 1517) of Communication Device 200, which update Memory Card Interface Controller 20663OSh stored in Operating System 20663OS (FIG. 1511) of Communication Device 200. As described in the present drawing, CPU 211 (FIG. 1) of Communication Device 200 sends a Memory Card Interface Controller Update Request, which is received by Host H (S1). Here, the Memory Card Interface Controller Update Request is a request to send Memory Card Interface Controller Version Data H63*b*1*h* (FIG. 1524) stored in Host H to Communication Device 200. In response to the request, Host H retrieves Memory Card Interface Controller Version Data H63*b*1*h* from OS Version Data Storage Area H63*b*1 (FIG. 1524), and sends the data to Communication Device 200 (S2). Upon receiving Memory Card Interface Controller Version Data H63*b*1*h* from Host H (S3), CPU 211 compares Memory Card Interface Controller Version Data H63*b*1*h* with Memory Card Interface Controller Version Data 20663*b*1*h* stored in OS Version Data Storage Area 20663*b*1 (FIG. 1515) of Communication Device 200 (S4). Assuming that CPU211 detects in S4 that Memory Card Interface Controller Version Data 20663*b*1*h* of Communication Device 200 is of an old version. CPU 211 sends a New Memory Card Interface Controller Sending Request, which is received by Host H (S5). Here, the New Memory Card Interface Controller Sending Request is a request to send Memory Card Interface Controller H63OSh (FIG. 1520) stored in Host H to Communication Device 200. Host H retrieves Memory Card Interface Controller H63OSh (FIG. 1520), which is of the latest version, from Operating System Storage Area H63OS (FIG. 1520), and sends the controller to Communication Device 200 (S6). Upon receiving Memory Card Interface Controller H63OSh from Host H (S7), CPU 211 stores Memory Card Interface Controller H63OSh as Memory Card Interface Controller 20663OSh in Operating System 20663OS (FIG. 1511) (S8). The old version of Memory Card Interface Controller 20663OSh (FIG. 1511) is deleted.

FIG. 1544 illustrates Microphone Controller Updating Software H63*c*1*i* (FIG. 1526) of Host H (FIG. 429) and Microphone Controller Updating Software 20663*c*1*i* (FIG. 1517) of Communication Device 200, which update Microphone Controller 20663OSi stored in Operating System 20663OS (FIG. 1511) of Communication Device 200. As described in the present drawing, CPU 211 (FIG. 1) of Communication Device 200 retrieves Microphone Controller Version Data 20663*b*1*i* from OS Version Data Storage Area 20663*b*1 (FIG. 1515) and sends the data to Host H (S1). Upon receiving Microphone Controller Version Data 20663*b*1*i* (FIG. 1515) from Communication Device 200 (S2), Host H compares Microphone Controller Version Data 20663*b*1*i* (FIG. 1515) with Microphone Controller Version Data H63*b*1*i* stored in OS Version Data Storage Area H63*b*1 (FIG. 1524) of Host H (S3). Assuming that Host H detects in S3 that Microphone Controller Version Data 20663*b*1*i* of Communication Device 200 is of an old version. Host H retrieves Microphone Controller H63OSi, which is of the latest version, from Operating System Storage Area H63OS (FIG. 1520), and sends the controller to Communication Device 200 (S4). Upon receiving Microphone Controller H63OSi from Host H (S5), CPU 211 stores Microphone Controller H63OSi as Microphone Controller 20663OSi in Operating System 20663OS (FIG. 1511) (S6). The old version of Microphone Controller 20663OSi (FIG. 1511) is deleted.

FIG. 1545 illustrates another embodiment of Microphone Controller Updating Software H63*c*1*i* (FIG. 1526) of Host H (FIG. 429) and Microphone Controller Updating Software 20663*c*1*i* (FIG. 1517) of Communication Device 200, which update Microphone Controller 20663OSi stored in Operating System 20663OS (FIG. 1511) of Communication Device 200. As described in the present drawing, CPU 211 (FIG. 1) of Communication Device 200 sends a Microphone Controller Update Request, which is received by Host H (S1). Here, the Microphone Controller Update Request is a request to send Microphone Controller Version Data H63*b*1*i* (FIG. 1524) stored in Host H to Communication Device 200. In response to the request, Host H retrieves Microphone Controller Version Data H63*b*1*i* from OS Version Data Storage Area H63*b*1 (FIG. 1524), and sends the data to Communication Device 200 (S2). Upon receiving Microphone Controller Version Data H63*b*1*i* from Host H (S3), CPU 211 compares Microphone Controller Version Data H63*b*1*i* with Microphone Controller Version Data 20663*b*1*i* stored in OS Version Data Storage Area 20663*b*1 (FIG. 1515) of Communication Device 200 (S4). Assuming that CPU211 detects in S4 that Microphone Controller Version Data 20663*b*1*i* of Communication Device 200 is of an old version. CPU 211 sends a New Microphone Controller Sending Request, which is received by Host H (S5). Here, the New Microphone Controller Sending Request is a request to send Microphone Controller H63OSi (FIG. 1520) stored in Host H to Communication Device 200. Host H retrieves Microphone Controller H63OSi (FIG. 1520), which is of the latest version, from Operating System Storage Area H63OS (FIG. 1520), and sends the controller to Communication Device 200 (S6). Upon receiving Microphone Controller H63OSi from Host H (S7), CPU 211 stores Microphone Controller H63OSi as Microphone Controller 20663OSi in Operating System 20663OS (FIG. 1511) (S8). The old version of Microphone Controller 20663OSi (FIG. 1511) is deleted.

FIG. 1546 illustrates Photometer Controller Updating Software H63*c*1*j* (FIG. 1526) of Host H (FIG. 429) and Photometer Controller Updating Software 20663*c*1*j* (FIG. 1517) of Communication Device 200, which update Photometer Controller 20663OSj stored in Operating System 20663OS (FIG. 1511) of Communication Device 200. As described in the present drawing, CPU 211 (FIG. 1) of Communication Device 200 retrieves Photometer Controller Version Data 20663*b*1*j* from OS Version Data Storage Area 20663*b*1 (FIG. 1515) and sends the data to Host H (S1). Upon receiving Photometer Controller Version Data 20663*b*1*j* (FIG. 1515) from Communication Device 200 (S2), Host H compares Photometer Controller Version Data 20663*b*1*j* (FIG. 1515) with Photometer Controller Version Data H63*b*1*j* stored in OS Version Data Storage Area H63*b*1 (FIG. 1524) of Host H (S3). Assuming that Host H detects in S3 that Photometer Controller Version Data 20663*b*1*j* of Communication Device 200 is of an old version. Host H retrieves Photometer Controller H63OSj, which is of the latest version, from Operating System Storage Area H63OS (FIG. 1520), and sends the controller to Communication Device 200 (S4). Upon receiving Photometer Controller H63OSj from Host H (S5), CPU 211 stores Photometer Controller H63OSj as Photometer Controller 20663OSj in Operating System 20663OS (FIG. 1511) (S6). The old version of Photometer Controller 20663OSj (FIG. 1511) is deleted.

FIG. 1547 illustrates another embodiment of Photometer Controller Updating Software H63*c*1*j* (FIG. 1526) of Host H (FIG. 429) and Photometer Controller Updating Software 20663*c*1*j* (FIG. 1517) of Communication Device 200, which update Photometer Controller 20663OSj stored in Operating System 20663OS (FIG. 1511) of Communication Device 200. As described in the present drawing, CPU 211 (FIG. 1) of Communication Device 200 sends a Photometer Controller Update Request, which is received by Host H (S1). Here, the Photometer Controller Update Request is a request to send Photometer Controller Version Data H63*b*1*j* (FIG. 1524) stored in Host H to Communication Device 200. In response to the request, Host H retrieves Photometer Controller Version Data H63*b*1*j* from OS Version Data Storage Area H63*b*1 (FIG. 1524), and sends the data to Communication Device 200 (S2). Upon receiving Photometer Controller Version Data H63*b*1*j* from Host H (S3), CPU 211 compares Photometer Controller Version Data H63*b*1*j* with Photometer Controller Version Data 20663*b*1*j* stored in OS Version Data Storage Area 20663*b*1 (FIG. 1515) of Communication Device 200 (S4). Assuming that CPU211 detects in S4 that Photometer Controller Version Data 20663*b*1*j* of Communication Device 200 is of an old version. CPU 211 sends a New Photometer Controller Sending Request, which is received by Host H (S5). Here, the New Photometer Controller Sending Request is a request to send Photometer Controller H63OSj (FIG. 1520) stored in Host H to Communication Device 200. Host H retrieves Photometer Controller H63OSj (FIG. 1520), which is of the latest version, from Operating System Storage Area H63OS (FIG. 1520), and sends the controller to Communication Device 200 (S6). Upon receiving Photometer Controller H63OSj from Host H (S7), CPU 211 stores Photometer Controller H63OSj as Photometer Controller 20663OSj in Operating System 20663OS (FIG. 1511) (S8). The old version of Photometer Controller 20663OSj (FIG. 1511) is deleted.

FIG. 1548 illustrates RAM Controller Updating Software H63*c*1*k* (FIG. 1526) of Host H (FIG. 429) and RAM Controller Updating Software 20663*c*1*k* (FIG. 1517) of Communication Device 200, which update RAM Controller 20663OSk stored in Operating System 20663OS (FIG. 1511) of Communication Device 200. As described in the present drawing, CPU 211 (FIG. 1) of Communication Device 200 retrieves RAM Controller Version Data 20663*b*1*k* from OS Version Data Storage Area 20663*b*1 (FIG. 1515) and sends the data to Host H (S1). Upon receiving RAM Controller Version Data 20663*b*1*k* (FIG. 1515) from Communication Device 200 (S2), Host H compares RAM Controller Version Data 20663*b*1*k* (FIG. 1515) with RAM Controller Version Data H63*b*1*k* stored in OS Version Data Storage Area H63*b*1 (FIG. 1524) of Host H (S3). Assuming that Host H detects in S3 that RAM Controller Version Data 20663*b*1*k* of Communication Device 200 is of an old version. Host H retrieves RAM Controller H63OSk, which is of the latest version, from Operating System Storage Area H63OS (FIG. 1520), and sends the controller to Communication Device 200 (S4). Upon receiving RAM Controller H63OSk from Host H (S5), CPU 211 stores RAM Controller H63OSk as RAM Controller 20663OSk in Operating System 20663OS (FIG. 1511) (S6). The old version of RAM Controller 20663OSk (FIG. 1511) is deleted.

FIG. 1549 illustrates another embodiment of RAM Controller Updating Software H63*c*1*k* (FIG. 1526) of Host H (FIG. 429) and RAM Controller Updating Software 20663*c*1*k* (FIG. 1517) of Communication Device 200, which update RAM Controller 20663OSk stored in Operating System 20663OS (FIG. 1511) of Communication Device 200. As described in the present drawing, CPU 211 (FIG. 1) of Communication Device 200 sends a RAM Controller Update Request, which is received by Host H (S1). Here, the RAM Controller Update Request is a request to send RAM Controller Version Data H63*b*1*k* (FIG. 1524) stored in Host H to Communication Device 200. In response to the request, Host H retrieves RAM Controller Version Data H63*b*1*k* from OS Version Data Storage Area H63*b*1 (FIG. 1524), and sends the data to Communication Device 200 (S2). Upon receiving RAM Controller Version Data H63*b*1*k* from Host H (S3), CPU 211 compares RAM Controller Version Data H63*b*1*k* with RAM Controller Version Data 20663*b*1*k* stored in OS Version Data Storage Area 20663*b*1 (FIG. 1515) of Communication Device 200 (S4). Assuming that CPU211 detects in S4 that RAM Controller Version Data 20663*b*1*k* of Communication Device 200 is of an old version. CPU 211 sends a New RAM Controller Sending Request, which is received by Host H (S5). Here, the New RAM Controller Sending Request is a request to send RAM Controller H63OSk (FIG. 1520) stored in Host H to Communication Device 200. Host H retrieves RAM Controller H63OSk (FIG. 1520), which is of the latest version, from Operating System Storage Area H63OS (FIG. 1520), and sends the controller to Communication Device 200 (S6). Upon receiving RAM Controller H63OSk from Host H (S7), CPU 211 stores RAM Controller H63OSk as RAM Controller 20663OSk in Operating System 20663OS (FIG. 1511) (S8). The old version of RAM Controller 20663OSk (FIG. 1511) is deleted.

FIG. 1550 illustrates ROM Controller Updating Software H63*c*1*l* (FIG. 1526) of Host H (FIG. 429) and ROM Controller Updating Software 20663*c*1*l* (FIG. 1517) of Communication Device 200, which update ROM Controller 20663OSl stored in Operating System 20663OS (FIG. 1511) of Communication Device 200. As described in the present drawing, CPU 211 (FIG. 1) of Communication Device 200 retrieves ROM Controller Version Data 20663*b*1*l* from OS Version Data Storage Area 20663*b*1 (FIG. 1515) and sends the data to Host H (S1). Upon receiving ROM Controller Version Data 20663*b*1*l* (FIG. 1515) from Communication Device 200 (S2), Host H compares ROM Controller Version Data 20663*b*1*l* (FIG. 1515) with ROM Controller Version Data H63*b*1*l* stored in OS Version Data Storage Area H63*b*1 (FIG. 1524) of Host H (S3). Assuming that Host H detects in S3 that ROM Controller Version Data 20663*b*1*l* of Communication Device 200 is of an old version. Host H retrieves ROM Controller H63OSl, which is of the latest version, from Operating System Storage Area H63OS (FIG. 1520), and sends the controller to Communication Device 200 (S4). Upon receiving ROM Controller H63OSl from Host H (S5), CPU 211 stores ROM Controller H63OSl as ROM Controller 20663OSl in Operating System 20663OS (FIG. 1511) (S6). The old version of ROM Controller 20663OSl (FIG. 1511) is deleted.

FIG. 1551 illustrates another embodiment of ROM Controller Updating Software H63*c*1*l* (FIG. 1526) of Host H (FIG. 429) and ROM Controller Updating Software 20663*c*1*l* (FIG. 1517) of Communication Device 200, which update ROM Controller 20663OSl stored in Operating System 20663OS (FIG. 1511) of Communication Device 200. As described in the present drawing, CPU 211 (FIG. 1) of Communication Device 200 sends a ROM Controller Update Request, which is received by Host H (S1). Here, the ROM Controller Update Request is a request to send ROM Controller Version Data H63*b*1*l* (FIG. 1524) stored in Host H to Communication Device 200. In response to the request, Host H retrieves ROM Controller Version Data H63*b*1*l* from OS Version Data Storage Area H63*b*1 (FIG. 1524), and sends the data to Communication Device 200 (S2). Upon receiving ROM Controller Version Data H63*b*1*l* from Host H (S3), CPU 211 compares ROM Controller Version Data H63*b*1*l* with ROM Controller Version Data 20663*b*1*l* stored in OS Version Data Storage Area 20663*b*1 (FIG. 1515) of Communication Device 200 (S4). Assuming that CPU211 detects in S4 that ROM Controller Version Data 20663*b*1*l* of Communication Device 200 is of an old version. CPU 211 sends a New ROM Controller Sending Request, which is received by Host H (S5). Here, the New ROM Controller Sending Request is a request to send ROM Controller H63OSl (FIG. 1520) stored in Host H to Communication Device 200. Host H retrieves ROM Controller H63OSl (FIG. 1520), which is of the latest version, from Operating System Storage Area H63OS (FIG. 1520), and sends the controller to Communication Device 200 (S6). Upon receiving ROM Controller H63OSl from Host H (S7), CPU 211 stores ROM Controller H63OSl as ROM Controller 20663OSl in Operating System 20663OS (FIG. 1511) (S8). The old version of ROM Controller 20663OSl (FIG. 1511) is deleted.

FIG. 1552 illustrates Signal Processor Controller Updating Software H63*c*1*m* (FIG. 1527) of Host H (FIG. 429) and Signal Processor Controller Updating Software 20663*c*1*m* (FIG. 1518) of Communication Device 200, which update Signal Processor Controller 20663OSm stored in Operating System 20663OS (FIG. 1512) of Communication Device 200. As described in the present drawing, CPU 211 (FIG. 1) of Communication Device 200 retrieves Signal Processor Controller Version Data 20663*b*1*m* from OS Version Data Storage Area 20663*b*1 (FIG. 1516) and sends the data to Host H (S1). Upon receiving Signal Processor Controller Version Data 20663*b*1*m* (FIG. 1516) from Communication Device 200 (S2), Host H compares Signal Processor Controller Version Data 20663*b*1*m* (FIG. 1516) with Signal Processor Controller Version Data H63*b*1*m* stored in OS Version Data Storage Area H63*b*1 (FIG. 1525) of Host H (S3). Assuming that Host H detects in S3 that Signal Processor Controller Version Data 20663*b*1*m* of Communication Device 200 is of an old version. Host H retrieves Signal Processor Controller H63OSm, which is of the latest version, from Operating System Storage Area H63OS (FIG. 1521), and sends the controller to Communication Device 200 (S4). Upon receiving Signal Processor Controller H63OSm from Host H (S5), CPU 211 stores Signal Processor Controller H63OSm as Signal Processor Controller 20663OSm in Operating System 20663OS (FIG. 1512) (S6). The old version of Signal Processor Controller 20663OSm (FIG. 1512) is deleted.

FIG. 1553 illustrates another embodiment of Signal Processor Controller Updating Software H63*c*1*m* (FIG. 1527) of Host H (FIG. 429) and Signal Processor Controller Updating Software 20663*c*1*m* (FIG. 1518) of Communication Device 200, which update Signal Processor Controller 20663OSm stored in Operating System 20663OS (FIG. 1512) of Communication Device 200. As described in the present drawing, CPU 211 (FIG. 1) of Communication Device 200 sends a Signal Processor Controller Update Request, which is received by Host H (S1). Here, the Signal Processor Controller Update Request is a request to send Signal Processor Controller Version Data H63*b*1*m* (FIG. 1525) stored in Host H to Communication Device 200. In response to the request, Host H retrieves Signal Processor Controller Version Data H63*b*1*m* from OS Version Data Storage Area H63*b*1 (FIG. 1525), and sends the data to Communication Device 200 (S2). Upon receiving Signal Processor Controller Version Data H63*b*1*m* from Host H (S3), CPU 211 compares Signal Processor Controller Version Data H63*b*1*m* with Signal Processor Controller Version Data 20663*b*1*m* stored in OS Version Data Storage Area 20663*b*1 (FIG. 1516) of Communication Device 200 (S4). Assuming that CPU211 detects in S4 that Signal Processor Controller Version Data 20663*b*1*m* of Communication Device 200 is of an old version. CPU 211 sends a New Signal Processor Controller Sending Request, which is received by Host H (S5). Here, the New Signal Processor Controller Sending Request is a request to send Signal Processor Controller H63OSm (FIG. 1521) stored in Host H to Communication Device 200. Host H retrieves Signal Processor Controller H63OSm (FIG. 1521), which is of the latest version, from Operating System Storage Area H63OS (FIG. 1521), and sends the controller to Communication Device 200 (S6). Upon receiving Signal Processor Controller H63OSm from Host H (S7), CPU 211 stores Signal Processor Controller H63OSm as Signal Processor Controller 20663OSm in Operating System 20663OS (FIG. 1512) (S8). The old version of Signal Processor Controller 20663OSm (FIG. 1512) is deleted.

FIG. 1554 illustrates Signal Processor Controller Updating Software H63*c*1*n* (FIG. 1527) of Host H (FIG. 429) and Signal Processor Controller Updating Software 20663*c*1*n* (FIG. 1518) of Communication Device 200, which update Signal Processor Controller 20663OSn stored in Operating System 20663OS (FIG. 1512) of Communication Device 200. As described in the present drawing, CPU 211 (FIG. 1) of Communication Device 200 retrieves Signal Processor Controller Version Data 20663*b*1*n* from OS Version Data Storage Area 20663*b*1 (FIG. 1516) and sends the data to Host H (S1). Upon receiving Signal Processor Controller Version Data 20663*b*1*n* (FIG. 1516) from Communication Device 200 (S2), Host H compares Signal Processor Controller Version Data 20663*b*1*n* (FIG. 1516) with Signal Processor Controller Version Data H63*b*1*n* stored in OS Version Data Storage Area H63*b*1 (FIG. 1525) of Host H (S3). Assuming that Host H detects in S3 that Signal Processor Controller Version Data 20663*b*1*n* of Communication Device 200 is of an old version. Host H retrieves Signal Processor Controller H63OSn, which is of the latest version, from Operating System Storage Area H63OS (FIG. 1521), and sends the controller to Communication Device 200 (S4). Upon receiving Signal Processor Controller H63OSn from Host H (S5), CPU 211 stores Signal Processor Controller H63OSn as Signal Processor Controller 20663OSn in Operating System 20663OS (FIG. 1512) (S6). The old version of Signal Processor Controller 20663OSn (FIG. 1512) is deleted.

FIG. 1555 illustrates another embodiment of Signal Processor Controller Updating Software H63*c*1*n* (FIG. 1527) of Host H (FIG. 429) and Signal Processor Controller Updating Software 20663*c*1*n* (FIG. 1518) of Communication Device 200, which update Signal Processor Controller 20663OSn stored in Operating System 20663OS (FIG. 1512) of Communication Device 200. As described in the present drawing, CPU 211 (FIG. 1) of Communication Device 200 sends a Signal Processor Controller Update Request, which is received by Host H (S1). Here, the Signal Processor Controller Update Request is a request to send Signal Processor Controller Version Data H63*b*1*n* (FIG. 1525) stored in Host H to Communication Device 200. In response to the request, Host H retrieves Signal Processor Controller Version Data H63*b*1*n* from OS Version Data Storage Area H63*b*1 (FIG. 1525), and sends the data to Communication Device 200 (S2). Upon receiving Signal Processor Controller Version Data H63*b*1*n* from Host H (S3), CPU 211 compares Signal Processor Controller Version Data H63*b*1*n* with Signal Processor Controller Version Data 20663*b*1*n* stored in OS Version Data Storage Area 20663*b*1 (FIG. 1516) of Communication Device 200 (S4). Assuming that CPU211 detects in S4 that Signal Processor Controller Version Data 20663*b*1*n* of Communication Device 200 is of an old version. CPU 211 sends a New Signal Processor Controller Sending Request, which is received by Host H (S5). Here, the New Signal Processor Controller Sending Request is a request to send Signal Processor Controller H63OSn (FIG. 1521) stored in Host H to Communication Device 200. Host H retrieves Signal Processor Controller H63OSn (FIG. 1521), which is of the latest version, from Operating System Storage Area H63OS (FIG. 1521), and sends the controller to Communication Device 200 (S6). Upon receiving Signal Processor Controller H63OSn from Host H (S7), CPU 211 stores Signal Processor Controller H63OSn as Signal Processor Controller

20663OSn in Operating System 20663OS (FIG. 1512) (S8). The old version of Signal Processor Controller 20663OSn (FIG. 1512) is deleted.

FIG. 1556 illustrates Solar Panel Controller Updating Software H63*c*1*o* (FIG. 1527) of Host H (FIG. 429) and Solar Panel Controller Updating Software 20663*c*10 (FIG. 1518) of Communication Device 200, which update Solar Panel Controller 20663OSo stored in Operating System 20663OS (FIG. 1512) of Communication Device 200. As described in the present drawing, CPU 211 (FIG. 1) of Communication Device 200 retrieves Solar Panel Controller Version Data 20663*b*1*o* from OS Version Data Storage Area 20663*b*1 (FIG. 1516) and sends the data to Host H (S1). Upon receiving Solar Panel Controller Version Data 20663*b*10 (FIG. 1516) from Communication Device 200 (S2), Host H compares Solar Panel Controller Version Data 20663*b*10 (FIG. 1516) with Solar Panel Controller Version Data H63*b*1*o* stored in OS Version Data Storage Area H63*b*1 (FIG. 1525) of Host H (S3). Assuming that Host H detects in S3 that Solar Panel Controller Version Data 20663*b*10 of Communication Device 200 is of an old version. Host H retrieves Solar Panel Controller H63OSo, which is of the latest version, from Operating System Storage Area H63OS (FIG. 1521), and sends the controller to Communication Device 200 (S4). Upon receiving Solar Panel Controller H63OSo from Host H (S5), CPU 211 stores Solar Panel Controller H63OSo as Solar Panel Controller 20663OSo in Operating System 20663OS (FIG. 1512) (S6). The old version of Solar Panel Controller 20663OSo (FIG. 1512) is deleted.

FIG. 1557 illustrates another embodiment of Solar Panel Controller Updating Software H63*c*1*o* (FIG. 1527) of Host H (FIG. 429) and Solar Panel Controller Updating Software 20663*c*10 (FIG. 1518) of Communication Device 200, which update Solar Panel Controller 20663OSo stored in Operating System 20663OS (FIG. 1512) of Communication Device 200. As described in the present drawing, CPU 211 (FIG. 1) of Communication Device 200 sends a Solar Panel Controller Update Request, which is received by Host H (S1). Here, the Solar Panel Controller Update Request is a request to send Solar Panel Controller Version Data H63*b*1*o* (FIG. 1525) stored in Host H to Communication Device 200. In response to the request, Host H retrieves Solar Panel Controller Version Data H63*b*1*o* from OS Version Data Storage Area H63*b*1 (FIG. 1525), and sends the data to Communication Device 200 (S2). Upon receiving Solar Panel Controller Version Data H63*b*1*o* from Host H (S3), CPU 211 compares Solar Panel Controller Version Data H63*b*1*o* with Solar Panel Controller Version Data 20663*b*10 stored in OS Version Data Storage Area 20663*b*1 (FIG. 1516) of Communication Device 200 (S4). Assuming that CPU211 detects in S4 that Solar Panel Controller Version Data 20663*b*1*o* of Communication Device 200 is of an old version. CPU 211 sends a New Solar Panel Controller Sending Request, which is received by Host H (S5). Here, the New Solar Panel Controller Sending Request is a request to send Solar Panel Controller H63OSo (FIG. 1521) stored in Host H to Communication Device 200. Host H retrieves Solar Panel Controller H63OSo (FIG. 1521), which is of the latest version, from Operating System Storage Area H63OS (FIG. 1521), and sends the controller to Communication Device 200 (S6). Upon receiving Solar Panel Controller H63OSo from Host H (S7), CPU 211 stores Solar Panel Controller H63OSo as Solar Panel Controller 20663OSo in Operating System 20663OS (FIG. 1512) (S8). The old version of Solar Panel Controller 20663OSo (FIG. 1512) is deleted.

FIG. 1558 illustrates Speaker Controller Updating Software H63*c*1*p* (FIG. 1527) of Host H (FIG. 429) and Speaker Controller Updating Software 20663*c*1*p* (FIG. 1518) of Communication Device 200, which update Speaker Controller 20663OSp stored in Operating System 20663OS (FIG. 1512) of Communication Device 200. As described in the present drawing, CPU 211 (FIG. 1) of Communication Device 200 retrieves Speaker Controller Version Data 20663*b*1*p* from OS Version Data Storage Area 20663*b*1 (FIG. 1516) and sends the data to Host H (S1). Upon receiving Speaker Controller Version Data 20663*b*1*p* (FIG. 1516) from Communication Device 200 (S2), Host H compares Speaker Controller Version Data 20663*b*1*p* (FIG. 1516) with Speaker Controller Version Data H63*b*1*p* stored in OS Version Data Storage Area H63*b*1 (FIG. 1525) of Host H (S3). Assuming that Host H detects in S3 that Speaker Controller Version Data 20663*b*1*p* of Communication Device 200 is of an old version. Host H retrieves Speaker Controller H63OSp, which is of the latest version, from Operating System Storage Area H63OS (FIG. 1521), and sends the controller to Communication Device 200 (S4). Upon receiving Speaker Controller H63OSp from Host H (S5), CPU 211 stores Speaker Controller H63OSp as Speaker Controller 20663OSp in Operating System 20663OS (FIG. 1512) (S6). The old version of Speaker Controller 20663OSp (FIG. 1512) is deleted.

FIG. 1559 illustrates another embodiment of Speaker Controller Updating Software H63*c*1*p* (FIG. 1527) of Host H (FIG. 429) and Speaker Controller Updating Software 20663*c*1*p* (FIG. 1518) of Communication Device 200, which update Speaker Controller 20663OSp stored in Operating System 20663OS (FIG. 1512) of Communication Device 200. As described in the present drawing, CPU 211 (FIG. 1) of Communication Device 200 sends a Speaker Controller Update Request, which is received by Host H (S1). Here, the Speaker Controller Update Request is a request to send Speaker Controller Version Data H63*b*1*p* (FIG. 1525) stored in Host H to Communication Device 200. In response to the request, Host H retrieves Speaker Controller Version Data H63*b*1*p* from OS Version Data Storage Area H63*b*1 (FIG. 1525), and sends the data to Communication Device 200 (S2). Upon receiving Speaker Controller Version Data H63*b*1*p* from Host H (S3), CPU 211 compares Speaker Controller Version Data H63*b*1*p* with Speaker Controller Version Data 20663*b*1*p* stored in OS Version Data Storage Area 20663*b*1 (FIG. 1516) of Communication Device 200 (S4). Assuming that CPU211 detects in S4 that Speaker Controller Version Data 20663*b*1*p* of Communication Device 200 is of an old version. CPU 211 sends a New Speaker Controller Sending Request, which is received by Host H (S5). Here, the New Speaker Controller Sending Request is a request to send Speaker Controller H63OSp (FIG. 1521) stored in Host H to Communication Device 200. Host H retrieves Speaker Controller H63OSp (FIG. 1521), which is of the latest version, from Operating System Storage Area H63OS (FIG. 1521), and sends the controller to Communication Device 200 (S6). Upon receiving Speaker Controller H63OSp from Host H (S7), CPU 211 stores Speaker Controller H63OSp as Speaker Controller 20663OSp in Operating System 20663OS (FIG. 1512) (S8). The old version of Speaker Controller 20663OSp (FIG. 1512) is deleted.

FIG. 1560 illustrates Vibrator Controller Updating Software H63*c*1*q* (FIG. 1527) of Host H (FIG. 429) and Vibrator Controller Updating Software 20663*c*1*q* (FIG. 1518) of Communication Device 200, which update Vibrator Controller 20663OSq stored in Operating System 20663OS (FIG. 1512) of Communication Device 200. As described in the present drawing, CPU 211 (FIG. 1) of Communication Device 200 retrieves Vibrator Controller Version Data 20663*b*1*q* from OS Version Data Storage Area 20663*b*1 (FIG.

1516) and sends the data to Host H (S1). Upon receiving Vibrator Controller Version Data 20663*b*1*q* (FIG. 1516) from Communication Device 200 (S2), Host H compares Vibrator Controller Version Data 20663*b*1*q* (FIG. 1516) with Vibrator Controller Version Data H63*b*1*q* stored in OS Version Data Storage Area H63*b*1 (FIG. 1525) of Host H (S3). Assuming that Host H detects in S3 that Vibrator Controller Version Data 20663*b*1*q* of Communication Device 200 is of an old version. Host H retrieves Vibrator Controller H63OSq, which is of the latest version, from Operating System Storage Area H63OS (FIG. 1521), and sends the controller to Communication Device 200 (S4). Upon receiving Vibrator Controller H63OSq from Host H (S5), CPU 211 stores Vibrator Controller H63OSq as Vibrator Controller 20663OSq in Operating System 20663OS (FIG. 1512) (S6). The old version of Vibrator Controller 20663OSq (FIG. 1512) is deleted.

FIG. 1561 illustrates another embodiment of Vibrator Controller Updating Software H63*c*1*q* (FIG. 1527) of Host H (FIG. 429) and Vibrator Controller Updating Software 20663*c*1*q* (FIG. 1518) of Communication Device 200, which update Vibrator Controller 20663OSq stored in Operating System 20663OS (FIG. 1512) of Communication Device 200. As described in the present drawing, CPU 211 (FIG. 1) of Communication Device 200 sends a Vibrator Controller Update Request, which is received by Host H (S1). Here, the Vibrator Controller Update Request is a request to send Vibrator Controller Version Data H63*b*1*q* (FIG. 1525) stored in Host H to Communication Device 200. In response to the request, Host H retrieves Vibrator Controller Version Data H63*b*1*q* from OS Version Data Storage Area H63*b*1 (FIG. 1525), and sends the data to Communication Device 200 (S2). Upon receiving Vibrator Controller Version Data H63*b*1*q* from Host H (S3), CPU 211 compares Vibrator Controller Version Data H63*b*1*q* with Vibrator Controller Version Data 20663*b*1*q* stored in OS Version Data Storage Area 20663*b*1 (FIG. 1516) of Communication Device 200 (S4). Assuming that CPU211 detects in S4 that Vibrator Controller Version Data 20663*b*1*q* of Communication Device 200 is of an old version. CPU 211 sends a New Vibrator Controller Sending Request, which is received by Host H (S5). Here, the New Vibrator Controller Sending Request is a request to send Vibrator Controller H63OSq (FIG. 1521) stored in Host H to Communication Device 200. Host H retrieves Vibrator Controller H63OSq (FIG. 1521), which is of the latest version, from Operating System Storage Area H63OS (FIG. 1521), and sends the controller to Communication Device 200 (S6). Upon receiving Vibrator Controller H63OSq from Host H (S7), CPU 211 stores Vibrator Controller H63OSq as Vibrator Controller 20663OSq in Operating System 20663OS (FIG. 1512) (S8). The old version of Vibrator Controller 20663OSq (FIG. 1512) is deleted.

FIG. 1562 illustrates Video Processor Controller Updating Software H63*c*1*r* (FIG. 1527) of Host H (FIG. 429) and Video Processor Controller Updating Software 20663*c*1*r* (FIG. 1518) of Communication Device 200, which update Video Processor Controller 20663OSr stored in Operating System 20663OS (FIG. 1512) of Communication Device 200. As described in the present drawing, CPU 211 (FIG. 1) of Communication Device 200 retrieves Video Processor Controller Version Data 20663*b*1*r* from OS Version Data Storage Area 20663*b*1 (FIG. 1516) and sends the data to Host H (S1). Upon receiving Video Processor Controller Version Data 20663*b*1*r* (FIG. 1516) from Communication Device 200 (S2), Host H compares Video Processor Controller Version Data 20663*b*1*r* (FIG. 1516) with Video Processor Controller Version Data H63*b*1*r* stored in OS Version Data Storage Area H63*b*1 (FIG. 1525) of Host H (S3). Assuming that Host H detects in S3 that Video Processor Controller Version Data 20663*b*1*r* of Communication Device 200 is of an old version. Host H retrieves Video Processor Controller H63OSr, which is of the latest version, from Operating System Storage Area H63OS (FIG. 1521), and sends the controller to Communication Device 200 (S4). Upon receiving Video Processor Controller H63OSr from Host H (S5), CPU 211 stores Video Processor Controller H63OSr as Video Processor Controller 20663OSr in Operating System 20663OS (FIG. 1512) (S6). The old version of Video Processor Controller 20663OSr (FIG. 1512) is deleted.

FIG. 1563 illustrates another embodiment of Video Processor Controller Updating Software H63*c*1*r* (FIG. 1527) of Host H (FIG. 429) and Video Processor Controller Updating Software 20663*c*1*r* (FIG. 1518) of Communication Device 200, which update Video Processor Controller 20663OSr stored in Operating System 20663OS (FIG. 1512) of Communication Device 200. As described in the present drawing, CPU 211 (FIG. 1) of Communication Device 200 sends a Video Processor Controller Update Request, which is received by Host H (S1). Here, the Video Processor Controller Update Request is a request to send Video Processor Controller Version Data H63*b*1*r* (FIG. 1525) stored in Host H to Communication Device 200. In response to the request, Host H retrieves Video Processor Controller Version Data H63*b*1*r* from OS Version Data Storage Area H63*b*1 (FIG. 1525), and sends the data to Communication Device 200 (S2). Upon receiving Video Processor Controller Version Data H63*b*1*r* from Host H (S3), CPU 211 compares Video Processor Controller Version Data H63*b*1*r* with Video Processor Controller Version Data 20663*b*1*r* stored in OS Version Data Storage Area 20663*b*1 (FIG. 1516) of Communication Device 200 (S4). Assuming that CPU211 detects in S4 that Video Processor Controller Version Data 20663*b*1*r* of Communication Device 200 is of an old version. CPU 211 sends a New Video Processor Controller Sending Request, which is received by Host H (S5). Here, the New Video Processor Controller Sending Request is a request to send Video Processor Controller H63OSr (FIG. 1521) stored in Host H to Communication Device 200. Host H retrieves Video Processor Controller H63OSr (FIG. 1521), which is of the latest version, from Operating System Storage Area H63OS (FIG. 1521), and sends the controller to Communication Device 200 (S6). Upon receiving Video Processor Controller H63OSr from Host H (S7), CPU 211 stores Video Processor Controller H63OSr as Video Processor Controller 20663OSr in Operating System 20663OS (FIG. 1512) (S8). The old version of Video Processor Controller 20663OSr (FIG. 1512) is deleted.

FIG. 1564 illustrates Wireless Receiver Controller Updating Software H63*c*1*s* (FIG. 1527) of Host H (FIG. 429) and Wireless Receiver Controller Updating Software 20663*c*1*s* (FIG. 1518) of Communication Device 200, which update Wireless Receiver Controller 20663OSs stored in Operating System 20663OS (FIG. 1512) of Communication Device 200. As described in the present drawing, CPU 211 (FIG. 1) of Communication Device 200 retrieves Wireless Receiver Controller Version Data 20663*b*1*s* from OS Version Data Storage Area 20663*b*1 (FIG. 1516) and sends the data to Host H (S1). Upon receiving Wireless Receiver Controller Version Data 20663*b*1*s* (FIG. 1516) from Communication Device 200 (S2), Host H compares Wireless Receiver Controller Version Data 20663*b*1*s* (FIG. 1516) with Wireless Receiver Controller Version Data H63*b*1*s* stored in OS Version Data Storage Area H63*b*1 (FIG. 1525) of Host H (S3). Assuming that Host H detects in S3 that Wireless Receiver Controller Version Data 20663*b*1*s* of Communication Device 200 is of an old version. Host H retrieves Wireless Receiver Controller H63OSs, which is of the latest version, from Operating System Storage Area H63OS (FIG. 1521), and sends the controller to Communication Device 200 (S4). Upon receiving Wireless Receiver Controller H63OSs from Host H (S5), CPU 211 stores Wireless Receiver Controller H63OSs as Wireless Receiver Controller 20663OSs in Operating System 20663OS (FIG. 1512) (S6). The old version of Wireless Receiver Controller 20663OSs (FIG. 1512) is deleted.

FIG. 1565 illustrates another embodiment of Wireless Receiver Controller Updating Software H63c1s (FIG. 1527) of Host H (FIG. 429) and Wireless Receiver Controller Updating Software 20663c1s (FIG. 1518) of Communication Device 200, which update Wireless Receiver Controller 20663OSs stored in Operating System 20663OS (FIG. 1512) of Communication Device 200. As described in the present drawing, CPU 211 (FIG. 1) of Communication Device 200 sends a Wireless Receiver Controller Update Request#1, which is received by Host H (S1). Here, the Wireless Receiver Controller Update Request#1 is a request to send Wireless Receiver Controller Version Data H63b1s (FIG. 1525) stored in Host H to Communication Device 200. In response to the request, Host H retrieves Wireless Receiver Controller Version Data H63b1s from OS Version Data Storage Area H63b1 (FIG. 1525), and sends the data to Communication Device 200 (S2). Upon receiving Wireless Receiver Controller Version Data H63b1s from Host H (S3), CPU 211 compares Wireless Receiver Controller Version Data H63b1s with Wireless Receiver Controller Version Data 20663b1s stored in OS Version Data Storage Area 20663b1 (FIG. 1516) of Communication Device 200 (S4). Assuming that CPU211 detects in S4 that Wireless Receiver Controller Version Data 20663b1s of Communication Device 200 is of an old version. CPU 211 sends a New Wireless Receiver Controller Sending Request#1, which is received by Host H (S5). Here, the New Wireless Receiver Controller Sending Request#1 is a request to send Wireless Receiver Controller H63OSs (FIG. 1521) stored in Host H to Communication Device 200. Host H retrieves Wireless Receiver Controller H63OSs (FIG. 1521), which is of the latest version, from Operating System Storage Area H63OS (FIG. 1521), and sends the controller to Communication Device 200 (S6). Upon receiving Wireless Receiver Controller H63OSs from Host H (S7), CPU 211 stores Wireless Receiver Controller H63OSs as Wireless Receiver Controller 20663OSs in Operating System 20663OS (FIG. 1512) (S8). The old version of Wireless Receiver Controller 20663OSs (FIG. 1512) is deleted.

FIG. 1566 illustrates Wireless Receiver Controller Updating Software H63c1t (FIG. 1527) of Host H (FIG. 429) and Wireless Receiver Controller Updating Software 20663c1t (FIG. 1518) of Communication Device 200, which update Wireless Receiver Controller 20663OSt stored in Operating System 20663OS (FIG. 1512) of Communication Device 200. As described in the present drawing, CPU 211 (FIG. 1) of Communication Device 200 retrieves Wireless Receiver Controller Version Data 20663b1t from OS Version Data Storage Area 20663b1 (FIG. 1516) and sends the data to Host H (S1). Upon receiving Wireless Receiver Controller Version Data 20663b1t (FIG. 1516) from Communication Device 200 (S2), Host H compares Wireless Receiver Controller Version Data 20663b1t (FIG. 1516) with Wireless Receiver Controller Version Data H63b1t stored in OS Version Data Storage Area H63b1 (FIG. 1525) of Host H (S3). Assuming that Host H detects in S3 that Wireless Receiver Controller Version Data 20663b1t of Communication Device 200 is of an old version. Host H retrieves Wireless Receiver Controller H63OSt, which is of the latest version, from Operating System Storage Area H63OS (FIG. 1521), and sends the controller to Communication Device 200 (S4). Upon receiving Wireless Receiver Controller H63OSt from Host H (S5), CPU 211 stores Wireless Receiver Controller H63OSt as Wireless Receiver Controller 20663OSt in Operating System 20663OS (FIG. 1512) (S6). The old version of Wireless Receiver Controller 20663OSt (FIG. 1512) is deleted.

FIG. 1567 illustrates another embodiment of Wireless Receiver Controller Updating Software H63c1t (FIG. 1527) of Host H (FIG. 429) and Wireless Receiver Controller Updating Software 20663c1t (FIG. 1518) of Communication Device 200, which update Wireless Receiver Controller 20663OSt stored in Operating System 20663OS (FIG. 1512) of Communication Device 200. As described in the present drawing, CPU 211 (FIG. 1) of Communication Device 200 sends a Wireless Receiver Controller Update Request#2, which is received by Host H (S1). Here, the Wireless Receiver Controller Update Request#2 is a request to send Wireless Receiver Controller Version Data H63b1t (FIG. 1525) stored in Host H to Communication Device 200. In response to the request, Host H retrieves Wireless Receiver Controller Version Data H63b1t from OS Version Data Storage Area H63b1 (FIG. 1525), and sends the data to Communication Device 200 (S2). Upon receiving Wireless Receiver Controller Version Data H63b1t from Host H (S3), CPU 211 compares Wireless Receiver Controller Version Data H63b1t with Wireless Receiver Controller Version Data 20663b1t stored in OS Version Data Storage Area 20663b1 (FIG. 1516) of Communication Device 200 (S4). Assuming that CPU211 detects in S4 that Wireless Receiver Controller Version Data 20663b1t of Communication Device 200 is of an old version. CPU 211 sends a New Wireless Receiver Controller Sending Request#2, which is received by Host H (S5). Here, the New Wireless Receiver Controller Sending Request#2 is a request to send Wireless Receiver Controller H63OSt (FIG. 1521) stored in Host H to Communication Device 200. Host H retrieves Wireless Receiver Controller H63OSt (FIG. 1521), which is of the latest version, from Operating System Storage Area H63OS (FIG. 1521), and sends the controller to Communication Device 200 (S6). Upon receiving Wireless Receiver Controller H63OSt from Host H (S7), CPU 211 stores Wireless Receiver Controller H63OSt as Wireless Receiver Controller 20663OSt in Operating System 20663OS (FIG. 1512) (S8). The old version of Wireless Receiver Controller 20663OSt (FIG. 1512) is deleted.

FIG. 1568 illustrates Wireless Receiver Controller Updating Software H63c1u (FIG. 1527) of Host H (FIG. 429) and Wireless Receiver Controller Updating Software 20663c1u (FIG. 1518) of Communication Device 200, which update Wireless Receiver Controller 20663OSu stored in Operating System 20663OS (FIG. 1512) of Communication Device 200. As described in the present drawing, CPU 211 (FIG. 1) of Communication Device 200 retrieves Wireless Receiver Controller Version Data 20663b1u from OS Version Data Storage Area 20663b1 (FIG. 1516) and sends the data to Host H (S1). Upon receiving Wireless Receiver Controller Version Data 20663b1u (FIG. 1516) from Communication Device 200 (S2), Host H compares Wireless Receiver Controller Version Data 20663b1u (FIG. 1516) with Wireless Receiver Controller Version Data H63b1u stored in OS Version Data Storage Area H63b1 (FIG. 1525) of Host H (S3). Assuming that Host H detects in S3 that Wireless Receiver Controller Version Data 20663b1u of Communication Device 200 is of an old version. Host H retrieves Wireless Receiver Controller H63OSu, which is of the latest version, from Operating System Storage Area H63OS (FIG. 1521), and sends the controller to Communication Device 200 (S4). Upon receiving Wireless Receiver Controller H63OSu from Host H (S5), CPU 211 stores Wireless Receiver Controller H63OSu as Wireless Receiver Controller 20663OSu in Operating System 20663OS (FIG. 1512) (S6). The old version of Wireless Receiver Controller 20663OSu (FIG. 1512) is deleted.

FIG. 1569 illustrates another embodiment of Wireless Receiver Controller Updating Software H63c1u (FIG. 1527) of Host H (FIG. 429) and Wireless Receiver Controller Updating Software 20663c1u (FIG. 1518) of Communication Device 200, which update Wireless Receiver Controller 20663OSu stored in Operating System 20663OS (FIG. 1512) of Communication Device 200. As described in the present drawing, CPU 211 (FIG. 1) of Communication Device 200 sends a Wireless Receiver Controller Update Request#3, which is received by Host H (S1). Here, the Wireless Receiver Controller Update Request#3 is a request to send Wireless Receiver Controller Version Data H63b1u (FIG. 1525) stored in Host H to Communication Device 200. In response to the request, Host H retrieves Wireless Receiver Controller Version Data H63b1u from OS Version Data Storage Area H63b1 (FIG. 1525), and sends the data to Communication Device 200 (S2). Upon receiving Wireless Receiver Controller Version Data H63b1u from Host H (S3), CPU 211 compares Wireless Receiver Controller Version Data H63b1u with Wireless Receiver Controller Version Data 20663b1u stored in OS Version Data Storage Area 20663b1 (FIG. 1516) of Communication Device 200 (S4). Assuming that CPU211 detects in S4 that Wireless Receiver Controller Version Data 20663b1u of Communication Device 200 is of an old version. CPU 211 sends a New Wireless Receiver Controller Sending Request#3, which is received by Host H (S5). Here, the New Wireless Receiver Controller Sending Request#3 is a request to send Wireless Receiver Controller H63OSu (FIG. 1521) stored in Host H to Communication Device 200. Host H retrieves Wireless Receiver Controller H63OSu (FIG. 1521), which is of the latest version, from Operating System Storage Area H63OS (FIG. 1521), and sends the controller to Communication Device 200 (S6). Upon receiving Wireless Receiver Controller H63OSu from Host H (S7), CPU 211 stores Wireless Receiver Controller H63OSu as Wireless Receiver Controller 20663OSu in Operating System 20663OS (FIG. 1512) (S8). The old version of Wireless Receiver Controller 20663OSu (FIG. 1512) is deleted.

FIG. 1570 illustrates Wireless Transmitter Controller Updating Software H63c1v (FIG. 1527) of Host H (FIG. 429) and Wireless Transmitter Controller Updating Software 20663c1v (FIG. 1518) of Communication Device 200, which update Wireless Transmitter Controller 20663OSv stored in Operating System 20663OS (FIG. 1512) of Communication Device 200. As described in the present drawing, CPU 211 (FIG. 1) of Communication Device 200 retrieves Wireless Transmitter Controller Version Data 20663b1v from OS Version Data Storage Area 20663b1 (FIG. 1516) and sends the data to Host H (S1). Upon receiving Wireless Transmitter Controller Version Data 20663b1v (FIG. 1516) from Communication Device 200 (S2), Host H compares Wireless Transmitter Controller Version Data 20663b1v (FIG. 1516) with Wireless Transmitter Controller Version Data H63b1v stored in OS Version Data Storage Area H63b1 (FIG. 1525) of Host H (S3). Assuming that Host H detects in S3 that Wireless Transmitter Controller Version Data 20663b1v of Communication Device 200 is of an old version. Host H retrieves Wireless Transmitter Controller H63OSv, which is of the latest version, from Operating System Storage Area H63OS (FIG. 1521), and sends the controller to Communication Device 200 (S4). Upon receiving Wireless Transmitter Controller H63OSv from Host H (S5), CPU 211 stores Wireless Transmitter Controller H63OSv as Wireless Transmitter Controller 20663OSv in Operating System 20663OS (FIG. 1512) (S6). The old version of Wireless Transmitter Controller 20663OSv (FIG. 1512) is deleted.

FIG. 1571 illustrates another embodiment of Wireless Transmitter Controller Updating Software H63c1v (FIG. 1527) of Host H (FIG. 429) and Wireless Transmitter Controller Updating Software 20663c1v (FIG. 1518) of Communication Device 200, which update Wireless Transmitter Controller 20663OSv stored in Operating System 20663OS (FIG. 1512) of Communication Device 200. As described in the present drawing, CPU 211 (FIG. 1) of Communication Device 200 sends a Wireless Transmitter Controller Update Request#1, which is received by Host H (S1). Here, the Wireless Transmitter Controller Update Request#1 is a request to send Wireless Transmitter Controller Version Data H63b1v (FIG. 1525) stored in Host H to Communication Device 200. In response to the request, Host H retrieves Wireless Transmitter Controller Version Data H63b1v from OS Version Data Storage Area H63b1 (FIG. 1525), and sends the data to Communication Device 200 (S2). Upon receiving Wireless Transmitter Controller Version Data H63b1v from Host H (S3), CPU 211 compares Wireless Transmitter Controller Version Data H63b1v with Wireless Transmitter Controller Version Data 20663b1v stored in OS Version Data Storage Area 20663b1 (FIG. 1516) of Communication Device 200 (S4). Assuming that CPU211 detects in S4 that Wireless Transmitter Controller Version Data 20663b1v of Communication Device 200 is of an old version. CPU 211 sends a New Wireless Transmitter Controller Sending Request#1, which is received by Host H (S5). Here, the New Wireless Transmitter Controller Sending Request#1 is a request to send Wireless Transmitter Controller H63OSv (FIG. 1521) stored in Host H to Communication Device 200. Host H retrieves Wireless Transmitter Controller H63OSv (FIG. 1521), which is of the latest version, from Operating System Storage Area H63OS (FIG. 1521), and sends the controller to Communication Device 200 (S6). Upon receiving Wireless Transmitter Controller H63OSv from Host H (S7), CPU 211 stores Wireless Transmitter Controller H63OSv as Wireless Transmitter Controller 20663OSv in Operating System 20663OS (FIG. 1512) (S8). The old version of Wireless Transmitter Controller 20663OSv (FIG. 1512) is deleted.

FIG. 1572 illustrates Wireless Transmitter Controller Updating Software H63c1w (FIG. 1527) of Host H (FIG. 429) and Wireless Transmitter Controller Updating Software 20663c1w (FIG. 1518) of Communication Device 200, which update Wireless Transmitter Controller 20663OSw stored in Operating System 20663OS (FIG. 1512) of Communication Device 200. As described in the present drawing, CPU 211 (FIG. 1) of Communication Device 200 retrieves Wireless Transmitter Controller Version Data 20663b1w from OS Version Data Storage Area 20663b1 (FIG. 1516) and sends the data to Host H (S1). Upon receiving Wireless Transmitter Controller Version Data 20663b1w (FIG. 1516) from Communication Device 200 (S2), Host H compares Wireless Transmitter Controller Version Data 20663b1w (FIG. 1516) with Wireless Transmitter Controller Version Data H63b1w stored in OS Version Data Storage Area H63b1 (FIG. 1525) of Host H (S3). Assuming that Host H detects in S3 that Wireless Transmitter Controller Version Data 20663b1w of Communication Device 200 is of an old version. Host H retrieves Wireless Transmitter Controller H63OSw, which is of the latest version, from Operating System Storage Area H63OS (FIG. 1521), and sends the controller to Communication Device 200 (S4). Upon receiving Wireless Transmitter Controller H63OSw from Host H (S5), CPU 211 stores Wireless Transmitter Controller H63OSw as Wireless Transmitter Controller 20663OSw in Operating System 20663OS (FIG. 1512) (S6). The old version of Wireless Transmitter Controller 20663OSw (FIG. 1512) is deleted.

FIG. 1573 illustrates another embodiment of Wireless Transmitter Controller Updating Software H63c1w (FIG. 1527) of Host H (FIG. 429) and Wireless Transmitter Controller Updating Software 20663c1w (FIG. 1518) of Communication Device 200, which update Wireless Transmitter Controller 20663OSw stored in Operating System 20663OS (FIG. 1512) of Communication Device 200. As described in the present drawing, CPU 211 (FIG. 1) of Communication Device 200 sends a Wireless Transmitter Controller Update Request#2, which is received by Host H (S1). Here, the Wireless Transmitter Controller Update Request#2 is a request to send Wireless Transmitter Controller Version Data H63b1w (FIG. 1525) stored in Host H to Communication Device 200. In response to the request, Host H retrieves Wireless Transmitter Controller Version Data H63b1w from OS Version Data Storage Area H63b1 (FIG. 1525), and sends the data to Communication Device 200 (S2). Upon receiving Wireless Transmitter Controller Version Data H63b1w from Host H (S3), CPU 211 compares Wireless Transmitter Controller Version Data H63b1w with Wireless Transmitter Controller Version Data 20663b1w stored in OS Version Data Storage Area 20663b1 (FIG. 1516) of Communication Device 200 (S4). Assuming that CPU211 detects in S4 that Wireless Transmitter Controller Version Data 20663b1w of Communication Device 200 is of an old version. CPU 211 sends a New Wireless Transmitter Controller Sending Request#2, which is received by Host H (S5). Here, the New Wireless Transmitter Controller Sending Request#2 is a request to send Wireless Transmitter Controller H63OSw (FIG. 1521) stored in Host H to Communication Device 200. Host H retrieves Wireless Transmitter Controller H63OSw (FIG. 1521), which is of the latest version, from Operating System Storage Area H63OS (FIG. 1521), and sends the controller to Communication Device 200 (S6). Upon receiving Wireless Transmitter Controller H63OSw from Host H (S7), CPU 211 stores Wireless Transmitter Controller H63OSw as Wireless Transmitter Controller 20663OSw in Operating System 20663OS (FIG. 1512) (S8). The old version of Wireless Transmitter Controller 20663OSw (FIG. 1512) is deleted.

FIG. 1574 illustrates Wireless Transmitter Controller Updating Software H63c1x (FIG. 1527) of Host H (FIG. 429) and Wireless Transmitter Controller Updating Software 20663c1x (FIG. 1518) of Communication Device 200, which update Wireless Transmitter Controller 20663OSx stored in Operating System 20663OS (FIG. 1512) of Communication Device 200. As described in the present drawing, CPU 211 (FIG. 1) of Communication Device 200 retrieves Wireless Transmitter Controller Version Data 20663b1x from OS Version Data Storage Area 20663b1 (FIG. 1516) and sends the data to Host H (S1). Upon receiving Wireless Transmitter Controller Version Data 20663b1x (FIG. 1516) from Communication Device 200 (S2), Host H compares Wireless Transmitter Controller Version Data 20663b1x (FIG. 1516) with Wireless Transmitter Controller Version Data H63b1x stored in OS Version Data Storage Area H63b1 (FIG. 1525) of Host H (S3). Assuming that Host H detects in S3 that Wireless Transmitter Controller Version Data 20663b1x of Communication Device 200 is of an old version. Host H retrieves Wireless Transmitter Controller H63OSx, which is of the latest version, from Operating System Storage Area H63OS (FIG. 1521), and sends the controller to Communication Device 200 (S4). Upon receiving Wireless Transmitter Controller H63OSx from Host H (S5), CPU 211 stores Wireless Transmitter Controller H63OSx as Wireless Transmitter Controller 20663OSx in Operating System 20663OS (FIG. 1512) (S6). The old version of Wireless Transmitter Controller 20663OSx (FIG. 1512) is deleted.

FIG. 1575 illustrates another embodiment of Wireless Transmitter Controller Updating Software H63c1x (FIG. 1527) of Host H (FIG. 429) and Wireless Transmitter Controller Updating Software 20663c1x (FIG. 1518) of Communication Device 200, which update Wireless Transmitter Controller 20663OSx stored in Operating System 20663OS (FIG. 1512) of Communication Device 200. As described in the present drawing, CPU 211 (FIG. 1) of Communication Device 200 sends a Wireless Transmitter Controller Update Request#3, which is received by Host H (S1). Here, the Wireless Transmitter Controller Update Request#3 is a request to send Wireless Transmitter Controller Version Data H63b1x (FIG. 1525) stored in Host H to Communication Device 200. In response to the request, Host H retrieves Wireless Transmitter Controller Version Data H63b1x from OS Version Data Storage Area H63b1 (FIG. 1525), and sends the data to Communication Device 200 (S2). Upon receiving Wireless Transmitter Controller Version Data H63b1x from Host H (S3), CPU 211 compares Wireless Transmitter Controller Version Data H63b1x with Wireless Transmitter Controller Version Data 20663b1x stored in OS Version Data Storage Area 20663b1 (FIG. 1516) of Communication Device 200 (S4). Assuming that CPU211 detects in S4 that Wireless Transmitter Controller Version Data 20663b1x of Communication Device 200 is of an old version. CPU 211 sends a New Wireless Transmitter Controller Sending Request#3, which is received by Host H (S5). Here, the New Wireless Transmitter Controller Sending Request#3 is a request to send Wireless Transmitter Controller H63OSx (FIG. 1521) stored in Host H to Communication Device 200. Host H retrieves Wireless Transmitter Controller H63OSx (FIG. 1521), which is of the latest version, from Operating System Storage Area H63OS (FIG. 1521), and sends the controller to Communication Device 200 (S6). Upon receiving Wireless Transmitter Controller H63OSx from Host H (S7), CPU 211 stores Wireless Transmitter Controller H63OSx as Wireless Transmitter Controller 20663OSx in Operating System 20663OS (FIG. 1512) (S8). The old version of Wireless Transmitter Controller 20663OSx (FIG. 1512) is deleted.

As another embodiment, each and all data and software programs described in this specification stored in Communication Device 200 may be updated in the manner described hereinbefore.

For the avoidance of doubt, the present function may be utilized to repair the operating system of Communication Device 200, i.e., Operating System 20663OS (FIGS. 1511 and 1512) in the form of downloading updates.

<<OS Updating Function—Summary>>

(1) A communication device comprising a microphone, a speaker, a display, an input device, an operating system, and a multiple mode implementor, wherein said multiple mode implementor implements a voice communication mode and an OS updating mode, a series of audio data are input to and output from said microphone and said speaker respectively when said voice communication mode is implemented, said operating system is updated when said OS updating mode is implemented.

(2) An OS updating system comprising a host computer and a communication device, wherein said communication device comprises a microphone, a speaker, a display, an input device, an antenna, and an operating system, said operating system comprises an OS element, said host computer stores an updated OS element, said updated OS element is sent from said host computer and received by said communication device via said antenna, said operating system is updated by installing said updated OS element.

<<Device Managing Function>>

FIGS. 1576 through 1587 illustrate the device managing function which enables the user of Communication Device 200 to manage, such as to add and delete device controllers attached to or installed in Communication Device 200.

FIG. 1576 illustrates the storage area included in RAM 206 (FIG. 1). As described in the present drawing, RAM 206 includes Device Managing Information Storage Area 20664*a* of which the data and the software programs stored therein are described in FIG. 1577.

FIG. 1577 illustrates the storage areas included in Device Managing Information Storage Area 20664*a* (FIG. 1576). As described in the present drawing, Device Managing Information Storage Area 20664*a* includes Device Managing Data Storage Area 20664*b* and Device Managing Software Storage Area 20664*c*. Device Managing Data Storage Area 20664*b* stores the data necessary to implement the present function, such as the ones described in FIGS. 1578 through 1581. Device Managing Software Storage Area 20664*c* stores the software programs necessary to implement the present function, such as the ones described in FIG. 1582.

FIG. 1578 illustrates the storage areas included in Device Managing Data Storage Area 20664*b* (FIG. 1577). As described in the present drawing, Device Managing Data Storage Area 20664*b* includes Device Controller Data Storage Area 20664*b*1, Device Image Data Storage Area 20664*b*2, and Device Image Location Data Storage Area 20664*b*3. Device Controller Data Storage Area 20664*b*1 stores the data described in FIG. 1579. Device Image Data Storage Area 20664*b*2 stores the data described in FIG. 1580. Device Image Location Data Storage Area 20664*b*3 stores the data described in FIG. 1581.

FIG. 1579 illustrates the data stored in Device Controller Data Storage Area 20664*b*1 (FIG. 1578). As described in the present drawing, Device Controller Data Storage Area 20664*b*1 comprises two columns, i.e., 'Device Controller ID' and 'Device Controller Data'. Column 'Device Controller ID' stores the device controller IDs, and each device controller ID is an identification of the corresponding device controller data stored in column 'Device Controller Data'. Column 'Device Controller Data' stores the device controller data, and each device controller data is a controller which controls the corresponding device attached to or installed in Communication Device 200. In the example described in the present drawing, Device Controller Data Storage Area 20664*b*1 stores the following data: the device controller ID 'Device Controller#1' and the corresponding device controller data 'Device Controller Data#1'; the device controller ID 'Device Controller#2' and the corresponding device controller data 'Device Controller Data#2'; the device controller ID 'Device Controller#3' and the corresponding device controller data 'Device Controller Data#3'; the device controller ID 'Device Controller#4' and the corresponding device controller data 'Device Controller Data#4'; and the device controller ID 'Device Controller#5' and the corresponding device controller data 'Device Controller Data#5'. Here, the device control data may be of any controller which controls the corresponding device attached to or installed in Communication Device 200. Therefore, the device control data stored in Device Controller Data Storage Area 20664*b*1 may include the controllers described in FIGS. 1511 and 1512, i.e., Battery Controller 20663OSa, CCD Unit Controller 20663OSb, Flash Light Unit Controller 20663OSc, Indicator Controller 20663OSd, Input Device Controller 20663OSe, LCD Controller 20663OSf, LED Controller 20663OSg, Memory Card Interface Controller 20663OSh, Microphone Controller 20663OSi, Photometer Controller 20663OSj, RAM Controller 20663OSk, ROM Controller 20663OSl, Signal Processor Controller 20663OSm, Signal Processor Controller 20663OSn, Solar Panel Controller 20663OSo, Speaker Controller 20663OSp, Vibrator Controller 20663OSq, Video Processor Controller 20663OSr, Wireless Receiver Controller 20663OSs, Wireless Receiver Controller 20663OSt, Wireless Receiver Controller 20663OSu, Wireless Transmitter Controller 20663OSv, Wireless Transmitter Controller 20663OSw, and Wireless Transmitter Controller 20663OSx.

FIG. 1580 illustrates the data stored in Device Image Data Storage Area 20664*b*2 (FIG. 1578). As described in the present drawing, Device Image Data Storage Area 20664*b*2 comprises two columns, i.e., 'Device Controller ID' and 'Device Image Data'. Column 'Device Controller ID' stores the device controller IDs described hereinbefore. Column 'Device Image Data' stores the device image data, and each device image data is an image data designed to be displayed on LCD 201 (FIG. 1) which is unique to the device control data of the corresponding device control ID. In the example described in the present drawing, Device Image Data Storage Area 20664*b*2 stores the following data: the device controller ID 'Device Controller#1' and the corresponding device image data 'Device Image Data#1'; the device controller ID 'Device Controller#2' and the corresponding device image data 'Device Image Data#2'; the device controller ID 'Device Controller#3' and the corresponding device image data 'Device Image Data#3'; the device controller ID 'Device Controller#4' and the corresponding device image data 'Device Image Data#4'; and the device controller ID 'Device Controller#5' and the corresponding device image data 'Device Image Data#5'.

FIG. 1581 illustrates the data stored in Device Image Location Data Storage Area 20664*b*3 (FIG. 1578). As described in the present drawing, Device Image Location Data Storage Area 20664*b*3 comprises two columns, i.e., 'Device Controller ID' and 'Device Image Location Data'. Column 'Device Controller ID' stores the device controller IDs described hereinbefore. Column 'Device Image Location Data' stores the device image location data, and each device image location data represents the location data in (x,y) format at which the device image data of the corresponding device controller ID is displayed on LCD 201 (FIG. 1). In the example described in the present drawing, Device Image Location Data Storage Area 20664*b*3 stores the following data: the device controller ID 'Device Controller#1' and the corresponding device image location data 'Device Image Location Data#1'; the device controller ID 'Device Controller#2' and the corresponding device image location data 'Device Image Location Data#2'; the device controller ID 'Device Controller#3' and the corresponding device image location data 'Device Image Location Data#3'; the device controller ID 'Device Controller#4' and the corresponding device image location data 'Device Image Location Data#4'; and the device controller ID 'Device Controller#5' and the corresponding device image location data 'Device Image Location Data#5'.

FIG. 1582 illustrates the software programs stored in Device Managing Software Storage Area 20664*c* (FIG. 1577). As described in the present drawing, Device Managing Software Storage Area 20664*c* stores Device Controller Displaying Software 20664*c*1, Device Controller Adding Software 20664*c*2, and Device Controller Deleting Software 20664*c*3. Device Controller Displaying Software 20664*c*1 is the software program described in FIG. 1585. Device Controller Adding Software 20664*c*2 is the software program described in FIG. 1586. Device Controller Deleting Software **20664*c*3 is the software program described in FIG. 1587**.

FIG. 1583 illustrates the device image data displayed on LCD 201 (FIG. 1). As described in the present drawing, five device image data, i.e., Device Image Data#1 through #5 are displayed on LCD 201, each of which at the predetermined location.

FIG. 1584 illustrates the device image data displayed on LCD 201 (FIG. 1). As described in the present drawing, four device image data, i.e., Device Image Data#1 through #4 are displayed on LCD 201, each of which at the predetermined location.

FIG. 1585 illustrates Device Controller Displaying Software **20664*c*1 (FIG. 1582), which displays the device image data on LCD 201 (FIG. 1) of Communication Device 200. The foregoing software program may be initiated either automatically by CPU 211 (FIG. 1) or manually by the user of Communication Device 200. Referring to the present drawing, CPU 211 (FIG. 1) retrieves the device controller IDs from Device Controller Data Storage Area 20664*b*1 (FIG. 1579) (S1). CPU 211 Retrieves the device image location data of the corresponding device controller IDs retrieved in S1 from Device Image Location Data Storage Area 20664*b*3 (FIG. 1581) (S2). CPU 211 retrieves the device image data of the corresponding device controller IDs retrieved in S1 from Device Image Data Storage Area 20664*b*2 (FIG. 1580) (S3). CPU 211 then displays on LCD 201 the device image data retrieved in S3 at the location identified by device image location data retrieved in S2 as described in FIG. 1583 (S4**).

FIG. 1586 illustrates Device Controller Adding Software **20664*c*2 (FIG. 1582), which adds a new device controller data to Communication Device 200. Assume that Device Controller Data#1 through #4 are currently stored in Device Controller Data Storage Area 20664*b*1 (FIG. 1579) and a new Device Controller Data#5 is about to be stored therein by executing Device Controller Adding Software 20664*c*2. The foregoing software program may be initiated either automatically by CPU 211 (FIG. 1) or manually by the user of Communication Device 200. Referring to the present drawing, CPU 211 (FIG. 1) adds a new device controller ID (for example, Device Controller#5) in Device Controller Data Storage Area 20664*b*1 (FIG. 1579) (S1). CPU 211 adds a new device controller data (for example, Device Controller Data#5) in column 'Device Controller Data' of Device Controller Data Storage Area 20664*b*1 (FIG. 1579) at the corresponding device controller ID crerated in S1 (S2). Here, the new device controller data to be added may be identified by either automatically by CPU 211 (FIG. 1) or manually by the user of Communication Device 200. CPU 211 adds the new device controller ID described in S1 (for example, Device Controller#5) in Device Image Data Storage Area 20664*b*2 (FIG. 1580) (S3). CPU 211 adds a new device image data (for example, Device Image Data#5) unique to the corresponding device controller data in column 'Device Image Data' of Device Image Data Storage Area 20664*b*2 (FIG. 1580) at the corresponding device controller ID created In S3 (S4). CPU 211 adds the new device controller ID described in S1 (for example, Device Controller#5) in Device Image Location Data Storage Area 20664*b*3 (FIG. 1581) (S5). CPU 211 adds the new device image location data (for example, Device Image Location Data#5) in column 'Device Image Location Data' of Device Image Location Data Storage Area 20664*b*3 (FIG. 1581) at the corresponding device controller ID created in S5 (S6). CPU 211 then executes Device Controller Displaying Software 20664*c*1 (FIG. 1585) to update the display (S7). The device image data (including Device Image Data#5) are displayed on LCD 201 in the manner described in FIG. 1583** thereafter.

FIG. 1587 illustrates Device Controller Deleting Software **20664*c*3 (FIG. 1582), which deletes a device control data from Communication Device 200. Assume that Device Controller Data#1 through #5 are currently stored in Device Controller Data Storage Area 20664*b*1 (FIG. 1579) and Device Controller Data#5 is about to be deleted therefrom by executing Device Controller Deleting Software 20664*c*3. The foregoing software program may be initiated either automatically by CPU 211 (FIG. 1) or manually by the user of Communication Device 200. Referring to the present drawing, the user of Communication Device 200, by utilizing Input Device 210 (FIG. 1) or via voice recognition system, selects a device image data (for example, Device Image Data#5) from the ones displayed on LCD 201. CPU 211 identifies the device controller ID (for example, Device Controller#5) of the corresponding device image data (for example Device Image Data#5) (S2). CPU 211 deletes the device controller ID (for example, Device Controller#5) identified in S2 and the corresponding device controller data (for example, Device Controller Data#5) stored in Device Controller Data Storage Area 20664*b*1 (FIG. 1579) (S3). CPU 211 deletes the device controller ID (for example, Device Controller#5) and the corresponding device image data (for example, Device Image Data#5) stored in Device Image Data Storage Area 20664*b*2 (FIG. 1580) (S4). CPU 211 deletes the device controller ID (for example, Device Controller#5) and the corresponding device image location data (for example, Device Image Location Data#5) stored in Device Image Location Data Storage Area 20664*b*3 (FIG. 1581) (S5). CPU 211 then executes Device Controller Displaying Software 20664*c*1 (FIG. 1585) to update the display (S6). The device image data (excluding Device Image Data#5) are displayed on LCD 201 in the manner described in FIG. 1584** thereafter.

<<Device Managing Function—Summary>>

(1) A communication device comprising a microphone, a speaker, a display, an input device, a storage area, and a multiple mode implementer, wherein said storage area stores a plurality of device controllers, said multiple mode implementer implements a voice communication mode and a device managing mode, a series of audio data are input to and output from said microphone and said speaker respectively when said voice communication mode is implemented, said plurality of device controllers are displayed on said display when said device managing mode is implemented.

(2) The communication device of summary (1), wherein a new device controller is added to said storage area, and said plurality of device controllers including said new device controller are displayed on said display.

(3) The communication device of summary (1), wherein a selected device controller is selected from said plurality of device controllers by utilizing said input device, said selected device controller is deleted from said storage area, and said plurality of device controllers excluding said selected device controller are displayed on said display.

<<Automobile Controlling Function>>

FIGS. 1588 through 1627 illustrate the automobile controlling function which enables Communication Device 200 to remotely control an automobile in a wireless fashion via Antenna 218 (FIG. 1).

FIG. 1588 illustrates the storage area included in Automobile 835, i.e., an automobile or a car. As described in the present drawing, Automobile 835 includes Automobile Controlling Information Storage Area 83565*a* of which the data and the software programs stored therein are described in FIG. 1589.

The data and software programs stored in Automobile Controlling Information Storage Area 83565*a* (FIG. 1588) are downloaded from Host H (FIG. 429) in the manner described in FIGS. 401 through 407.

FIG. 1589 illustrates the storage areas included in Automobile Controlling Information Storage Area 83565*a* (FIG. 1588). As described in the present drawing, Automobile Controlling Information Storage Area 83565*a* includes Automobile Controlling Data Storage Area 83565*b* and Automobile Controlling Software Storage Area 83565*c*. Automobile Controlling Data Storage Area 83565*b* stores the data necessary to implement the present function on the side of Automobile 835 (FIG. 1588), such as the ones described in FIGS. 1590 through 1596. Automobile Controlling Software Storage Area 83565*c* stores the software programs necessary to implement the present function on the side of Automobile 835, such as the ones described in FIG. 1597.

FIG. 1590 illustrates the storage areas included in Automobile Controlling Data Storage Area 83565*b* (FIG. 1589). As described in the present drawing, Automobile Controlling Data Storage Area 83565*b* includes User Acess Data Storage Area 83565*b*1, Window Data Storage Area 83565*b*2, Door Data Storage Area 83565*b*3, Radio Channel Data Storage Area 83565*b*4, TV Channel Data Storage Area 83565*b*5, Blinker Data Storage Area 83565*b*6, and Work Area 83565*b*7. User Acess Data Storage Area 83565*b*1 stores the data described in FIG. 1591. Window Data Storage Area 83565*b*2 stores the data described in FIG. 1592. Door Data Storage Area 83565*b*3 stores the data described in FIG. 1593. Radio Channel Data Storage Area 83565*b*4 stores the data described in FIG. 1594. TV Channel Data Storage Area 83565*b*5 stores the data described in FIG. 1595. Blinker Data Storage Area 83565*b*6 stores the data described in FIG. 1596. Work Area 83565*b*7 is utilized as a work area to perform calculation and temporarily store data. The data stored in Automobile Controlling Data Storage Area 83565*b* excluding the ones stored in User Acess Data Storage Area 83565*b*1 and Work Area 83565*b*7 are primarily utilized for reinstallation, i.e., to reinstall the data to Communication Device 200 as described hereinafter in case the data stored in Communication Device 200 are corrupted or lost.

FIG. 1591 illustrates the data stored in User Acess Data Storage Area 83565*b*1 (FIG. 1590). As described in the present drawing, User Acess Data Storage Area 83565*b*1 comprises two columns, i.e., 'User ID' and 'Password Data'. Column 'User ID' stores the user IDs, and each user ID is an identification of the user of Communication Device 200 authorized to implement the present function. Column 'Password Data' stores the password data, and each password data represents the password set by the user of the corresponding user ID. The password data is composed of alphanumeric data. In the example described in the present drawing, User Acess Data Storage Area 83565*b*1 stores the following data: the user ID 'User#1' and the corresponding password data 'Password Data#1'; the user ID 'User#2' and the corresponding password data 'Password Data#2'; the user ID 'User#3' and the corresponding password data 'Password Data#3'; and the user ID 'User#4' and the corresponding password data 'Password Data#4'. According to the present example, the users represented by User#1 through #4 are authorized to implement the present function.

FIG. 1592 illustrates the data stored in Window Data Storage Area 83565*b*2 (FIG. 1590). As described in the present drawing, Window Data Storage Area 83565*b*2 comprises two columns, i.e., 'Window ID' and 'Window Data'. Column 'Window ID' stores the window IDs, and each window ID is an identification of the window (not shown) of Automobile 835 (FIG. 1588). Column 'Window Data' stores the window data, and each window data is the image data designed to be displayed on LCD 201 (FIG. 1) which represents the postion of the window (not shown) of the corresponding window ID. In the example described in the present drawing, Window Data Storage Area 83565*b*2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4', are remotely controlable by implementing the present function.

FIG. 1593 illustrates the data stored in Door Data Storage Area 83565*b*3 (FIG. 1590). As described in the present drawing, Door Data Storage Area 83565*b*3 comprises two columns, i.e., 'Door ID' and 'Door Data'. Column 'Door ID' stores the door IDs, and each door ID is an identification of the door (not shown) of Automobile 835 (FIG. 1588). Column 'Door Data' stores the door data, and each door data is the image data designed to be displayed on LCD 201 (FIG. 1) which represents the position of the door (not shown) of the corresponding door ID. In the example described in the present drawing, Door Data Storage Area 83565*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 which are represented by the door IDs, 'Door#1' through 'Door#4', are remotely controlable by implementing the present function.

FIG. 1594 illustrates the data stored in Radio Channel Data Storage Area 83565*b*4 (FIG. 1590). As described in the present drawing, Radio Channel Data Storage Area 83565*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 1588). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area 83565*b*4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4', are remotely controlable by implementing the present invention.

FIG. 1595 illustrates the data stored in TV Channel Data Storage Area 83565*b*5 (FIG. 1590). As described in the present drawing, TV Channel Data Storage Area 83565*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 1588). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area **83565*b*5 stores the following data: the TV channel ID 'TV Channel#1' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4**', are remotely controlable by implementing the present invention.

FIG. 1596 illustrates the data stored in Blinker Data Storage Area **83565*b*6 (FIG. 1590). As described in the present drawing, Blinker Data Storage Area 83565*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 1588). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 83565*b*6 stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controlable by implementing the present invention. Here, the blinker (not shown) represented by 'Blinker#1' is the right blinker and the blinker (not shown) represented by 'Blinker#2**' is the left blinker.

FIG. 1597 illustrates the storage areas included in Automobile Controlling Software Storage Area **83565*c* (FIG. 1589). As described in the present drawing, Automobile Controlling Software Storage Area 83565*c* includes Automobile Controller Storage Area 83565*c*1 and Remote Controlling Software Storage Area 83565*c*2. Automobile Controller Storage Area 83565*c*1 stores the controllers described in FIG. 1598. Remote Controlling Software Storage Area 83565*c*2 stores the software programs described in FIG. 1599**.

FIG. 1598 illustrates the controllers stored in Automobile Controller Storage Area **83565*c*1 (FIG. 1597). As described in the present drawing, Automobile Controller Storage Area 83565*c*1 stores Engine Controller 83565*c*1*a*, Direction Controller 83565*c*1*b*, Speed Controller 83565*c*1*c*, Window Controller 83565*c*1*d*, Door Controller 83565*c*1*e*, Radio Controller 83565*c*1*f*, TV Controller 83565*c*1*g*, Radio Channel Selector 83565*c*1*h*, TV Channel Selector 83565*c*1*i*, Blinker Controller 83565*c*1*j*, Emergency Lamp Controller 83565*c*1*k*, Cruise Control Controller 83565*c*1*l*, and Speaker Volume Controller 83565*c*1*m*. Engine Controller 83565*c*1*a* is the controller which controls the engine (not shown) of Automobile 835 (FIG. 1588). Direction Controller 83565*c*1*b* is the controller which controls the steering wheel (not shown) of Automobile 835. Speed Controller 83565*c*1*c* is the controller which controls the accelerator (not shown) of Automobile 835. Window Controller 83565*c*1*d* is the controller which controls the windows (not shown) of Automobile 835. Door Controller 83565*c*1*e* is the controller which controls the doors (not shown) of Automobile 835. Radio Controller 83565*c*1*f* is the controller which controls the radio (not shown) of Automobile 835. TV Controller 83565*c*1*g* is the controller which controls the TV (not shown) of Automobile 835. Radio Channel Selector 83565*c*1*h* is the controller which controls the radio channels (not shown) of the radio (not shown) installed in Automobile 835. TV Channel Selector 83565*c*1*i* is the controller which controls the radio channels (not shown) of the radio (not shown) installed in Automobile 835. Blinker Controller 83565*c*1*j* is the controller which controls the blinkers (not shown) of Automobile 835. Emergency Lamp Controller 83565*c*1*k* is the controller which controls the emergency lamp (not shown) of Automobile 835. Cruise Control Controller 83565*c*1*l* is the controller which controls the cruise control (not shown) of Automobile 835. Speaker Volume Controller 83565*c*1*m* is the controller which controls the speaker (not shown) of Automobile 835**. As another embodiment, the foregoing controllers may be in the form of hardware instead of software.

FIG. 1599 illustrates the software programs stored in Remote Controlling Software Storage Area **83565*c*2 (FIG. 1597). As described in the present drawing, Remote Controlling Software Storage Area 83565*c*2 stores Engine Controlling Software 83565*c*2*a*, Direction Controlling Software 83565*c*2*b*, Speed Controlling Software 83565*c*2*c*, Window Controlling Software 83565*c*2*d*, Door Controlling Software 83565*c*2*e*, Radio Controlling Software 83565*c*2*f*, TV Controlling Software 83565*c*2*g*, Radio Channel Selecting Software 83565*c*2*h*, TV Channel Selecting Software 83565*c*2*i*, Blinker Controlling Software 83565*c*2*j*, Emergency Lamp Controlling Software 83565*c*2*k*, Cruise Control Controlling Software 83565*c*2*l*, Speaker Volume Controlling Software 83565*c*2*m*, Controller Reinstalling Software 83565*c*2*n*, Data Reinstalling Software 83565*c*2*o*, and User Access Authenticating Software 83565*c*2*p*. Engine Controlling Software 83565*c*2*a* is the software program described in FIG. 1613. Direction Controlling Software 83565*c*2*b* is the software program described in FIG. 1614. Speed Controlling Software 83565*c*2*c* is the software program described in FIG. 1615. Window Controlling Software 83565*c*2*d* is the software program described in FIG. 1616. Door Controlling Software 83565*c*2*e* is the software program described in FIG. 1617. Radio Controlling Software 83565*c*2*f* is the software program described in FIG. 1618. TV Controlling Software 83565*c*2*g* is the software program described in FIG. 1619. Radio Channel Selecting Software 83565*c*2*h* is the software program described in FIG. 1620. TV Channel Selecting Software 83565*c*2*i* is the software program described in FIG. 1621. Blinker Controlling Software 83565*c*2*j* is the software program described in FIG. 1622. Emergency Lamp Controlling Software 83565*c*2*k* is the software program described in FIG. 1623. Cruise Control Controlling Software 83565*c*2*l* is the software program described in FIG. 1624. Speaker Volume Controlling Software 83565*c*2*m* is the software program described in FIG. 1625. Controller Reinstalling Software 83565*c*2*n* is the software program described in FIG. 1626. Data Reinstalling Software 83565*c*2*o* is the software program described in FIG. 1627. User Access Authenticating Software 83565*c*2*p* is the software program described in FIG. 1612. The controllers stored in Automobile Controller Storage Area 83565*c*1 primarily functions as directly controlling Automobile 835 in the manner described in FIG. 1598, and the software programs stored in Remote Controlling Software Storage Area 83565*c*2 controls the controllers stored in Automobile Controller Storage Area 83565*c*1, by cooperating with the software programs stored in Remote Controlling Software Storage Area 20665*c*2 (FIG. 1611) of Communication Device 200, in a wireless fashion via Antenna 218 (FIG. 1**).

FIG. 1600 illustrates the storage area included in RAM 206 (FIG. 1) of Communication Device 200. As described in the present drawing, RAM 206 includes Automobile Controlling Information Storage Area **20665*a* of which the data and the software programs stored therein are described in FIG. 1601**.

The data and software programs stored in Automobile Controlling Information Storage Area **20665*a* (FIG. 1600) are downloaded from Host H (FIG. 429) in the manner described in FIGS. 401 through 407**.

FIG. 1601 illustrates the storage areas included in Automobile Controlling Information Storage Area **20665*a* (FIG. 1600). As described in the present drawing, Automobile Controlling Information Storage Area 20665*a* includes Automobile Controlling Data Storage Area 20665*b* and Automobile Controlling Software Storage Area 20665*c*. Automobile Controlling Data Storage Area 20665*b* stores the data necessary to implement the present function on the side of Communication Device 200, such as the ones described in FIGS. 1602 through 1608. Automobile Controlling Software Storage Area 20665*c* stores the software programs necessary to implement the present function on the side of Communication Device 200, such as the ones described in FIG. 1609**.

FIG. 1602 illustrates the storage areas included in Automobile Controlling Data Storage Area **20665*b* (FIG. 1601). As described in the present drawing, Automobile Controlling Data Storage Area 20665*b* includes User Acess Data Storage Area 20665*b*1, Window Data Storage Area 20665*b*2, Door Data Storage Area 20665*b*3, Radio Channel Data Storage Area 20665*b*4, TV Channel Data Storage Area 20665*b*5, Blinker Data Storage Area 20665*b*6, and Work Area 20665*b*7. User Acess Data Storage Area 20665*b*1 stores the data described in FIG. 1603. Window Data Storage Area 20665*b*2 stores the data described in FIG. 1604. Door Data Storage Area 20665*b*3 stores the data described in FIG. 1605. Radio Channel Data Storage Area 20665*b*4 stores the data described in FIG. 1606. TV Channel Data Storage Area 20665*b*5 stores the data described in FIG. 1607. Blinker Data Storage Area 20665*b*6 stores the data described in FIG. 1608. Work Area 20665*b*7** is utilized as a work area to perform calculation and temporarily store data.

FIG. 1603 illustrates the data stored in User Acess Data Storage Area **20665*b*1 (FIG. 1602). As described in the present drawing, User Acess Data Storage Area 20665*b*1 comprises two columns, i.e., 'User ID' and 'Password Data'. Column 'User ID' stores the user ID which is an identification of the user of Communication Device 200. Column 'Password Data' stores the password data which represents the password set by the user of Communication Device 200. The password data is composed of alphanumeric data. In the example described in the present drawing, User Acess Data Storage Area 20665*b*1 stores the following data: the user ID 'User#1' and the corresponding password data 'Password Data#1**'.

FIG. 1604 illustrates the data stored in Window Data Storage Area **20665*b*2 (FIG. 1602). As described in the present drawing, Window Data Storage Area 20665*b*2 comprises two columns, i.e., 'Window ID' and 'Window Data'. Column 'Window ID' stores the window IDs, and each window ID is an identification of the window (not shown) of Automobile 835 (FIG. 1588). Column 'Window Data' stores the window data, and each window data is the image data designed to be displayed on LCD 201 (FIG. 1) which represents the postion of the window (not shown) of the corresponding window ID. In the example described in the present drawing, Window Data Storage Area 20665*b*2 stores the following data: the window ID 'Window#1' and the corresponding window data 'Window Data#1'; the window ID 'Window#2' and the corresponding window data 'Window Data#2'; the window ID 'Window#3' and the corresponding window data 'Window Data#3'; and the window ID 'Window#4' and the corresponding window data 'Window Data#4'. Four windows of Automobile 835 which are represented by the window IDs, 'Window#1' through 'Window#4**', are remotely controlable by implementing the present function.

FIG. 1605 illustrates the data stored in Door Data Storage Area **20665*b*3 (FIG. 1602). As described in the present drawing, Door Data Storage Area 20665*b*3 comprises two columns, i.e., 'Door ID' and 'Door Data'. Column 'Door Data' stores the door data, and each door data is the image data designed to be displayed on LCD 201 (FIG. 1) which represents the postion of the door (not shown) of the corresponding door ID. In the example described in the present drawing, Door Data Storage Area 20665*b*3 stores the following data: the door ID 'Door#1' and the corresponding door data 'Door Data#1'; the door ID 'Door#2' and the corresponding door data 'Door Data#2'; the door ID 'Door#3' and the corresponding door data 'Door Data#3'; and the door ID 'Door#4' and the corresponding door data 'Door Data#4'. Four doors of Automobile 835 (FIG. 1588) which are represented by the door IDs, 'Door#1' through 'Door#4**', are remotely controlable by implementing the present function.

FIG. 1606 illustrates the data stored in Radio Channel Data Storage Area **20665*b*4 (FIG. 1602). As described in the present drawing, Radio Channel Data Storage Area 20665*b*4 comprises two columns, i.e., 'Radio Channel ID' and 'Radio Channel Data'. Column 'Radio Channel ID' stores the radio channel IDs, and each radio channel ID is an identification of the radio channel (not shown) playable by the radio (not shown) installed in Automobile 835 (FIG. 1588). Column 'Radio Channel Data' stores the radio channel data, and each radio channel data is the image data designed to be displayed on LCD 201 (FIG. 1) which represents the radio channel (not shown) of the corresponding radio channel ID. In the example described in the present drawing, Radio Channel Data Storage Area 20665*b*4 stores the following data: the radio channel ID 'Radio Channel#1' and the corresponding radio channel data 'Radio Channel Data#1'; the radio channel ID 'Radio Channel#2' and the corresponding radio channel data 'Radio Channel Data#2'; the radio channel ID 'Radio Channel#3' and the corresponding radio channel data 'Radio Channel Data#3'; and the radio channel ID 'Radio Channel#4' and the corresponding radio channel data 'Radio Channel Data#4'. Four radio channels which are represented by the radio channel IDs, 'Radio Channel#1' through 'Radio Channel#4**', are remotely controlable by implementing the present invention.

FIG. 1607 illustrates the data stored in TV Channel Data Storage Area **20665*b*5 (FIG. 1602). As described in the present drawing, TV Channel Data Storage Area 20665*b*5 comprises two columns, i.e., 'TV Channel ID' and 'TV Channel Data'. Column 'TV Channel ID' stores the TV channel IDs, and each TV channel ID is an identification of the TV channel (not shown) playable by the TV (not shown) installed in Automobile 835 (FIG. 1588). Column 'TV Channel Data' stores the TV channel data, and each TV channel data is the image data designed to be displayed on LCD 201 (FIG. 1) which represents the TV channel (not shown) of the corresponding TV channel ID. In the example described in the present drawing, TV Channel Data Storage Area 20665*b*5 stores the following data: the TV channel ID 'TV Channel#1**' and the corresponding TV channel data 'TV Channel Data#1'; the TV channel ID 'TV Channel#2' and the corresponding TV channel data 'TV Channel Data#2'; the TV channel ID 'TV Channel#3' and the corresponding TV channel data 'TV Channel Data#3'; and the TV channel ID 'TV Channel#4' and the corresponding TV channel data 'TV Channel Data#4'. Four TV channels which are represented by the TV channel IDs, 'TV Channel#1' through 'TV Channel#4', are remotely controlable by implementing the present invention.

FIG. 1608 illustrates the data stored in Blinker Data Storage Area **20665*b*6 (FIG. 1602). As described in the present drawing, Blinker Data Storage Area 20665*b*6 comprises two columns, i.e., 'Blinker ID' and 'Blinker Data'. Column 'Blinker ID' stores the blinker IDs, and each blinker ID is an identification of the blinker (not shown) of Automobile 835 (FIG. 1588). Column 'Blinker Data' stores the blinker data, and each blinker data is the image data designed to be displayed on LCD 201 (FIG. 1) which represents the blinker (not shown) of the corresponding blinker ID. In the example described in the present drawing, Blinker Data Storage Area 20665*b*6** stores the following data: the blinker ID 'Blinker#1' and the corresponding blinker data 'Blinker Data#1'; and the blinker ID 'Blinker#2' and the corresponding blinker data 'Blinker Data#2'. Two blinkers which are represented by the blinker IDs, 'Blinker#1' and 'Blinker#2', are remotely controlable by implementing the present invention. Here, the blinker (not shown) represented by 'Blinker#1' is the right blinker and the blinker (not shown) represented by 'Blinker#2' is the left blinker.

FIG. 1609 illustrates the storage areas included in Automobile Controlling Software Storage Area **20665*c* (FIG. 1601). As described in the present drawing, Automobile Controlling Software Storage Area 20665*c* includes Automobile Controller Storage Area 20665*c*1 and Remote Controlling Software Storage Area 20665*c*2. Automobile Controller Storage Area 20665*c*1 stores the controllers described in FIG. 1610. Remote Controlling Software Storage Area 20665*c*2 stores the software programs described in FIG. 1611**.

FIG. 1610 illustrates the controllers stored in Automobile Controller Storage Area **20665*c*1 (FIG. 1609). As described in the present drawing, Automobile Controller Storage Area 20665*c*1 stores Engine Controller 20665*c*1*a*, Direction Controller 20665*c*1*b*, Speed Controller 20665*c*1*c*, Window Controller 20665*c*1*d*, Door Controller 20665*c*1*e*, Radio Controller 20665*c*1*f*, TV Controller 20665*c*1*g*, Radio Channel Selector 20665*c*1*h*, TV Channel Selector 20665*c*1*i*, Blinker Controller 20665*c*1*j*, Emergency Lamp Controller 20665*c*1*k*, Cruise Control Controller 20665*c*1*l*, and Speaker Volume Controller 20665*c*1*m*. Engine Controller 20665*c*1*a* is the controller which controls the engine (not shown) of Automobile 206. Direction Controller 20665*c*1*b* is the controller which controls the steering wheel (not shown) of Automobile 206. Speed Controller 20665*c*1*c* is the controller which controls the accelerator (not shown) of Automobile 206. Window Controller 20665*c*1*d* is the controller which controls the windows (not shown) of Automobile 206. Door Controller 20665*c*1*e* is the controller which controls the doors (not shown) of Automobile 206. Radio Controller 20665*c*1*f* is the controller which controls the radio (not shown) of Automobile 206. TV Controller 20665*c*1*g* is the controller which controls the TV (not shown) of Automobile 206. Radio Channel Selector 20665*c*1*h* is the controller which controls the radio channels (not shown) of the radio (not shown) installed in Automobile 206. TV Channel Selector 20665*c*1*i* is the controller which controls the radio channels (not shown) of the radio (not shown) installed in Automobile 206. Blinker Controller 20665*c*1*j* is the controller which controls the blinkers (not shown) of Automobile 206. Emergency Lamp Controller 20665*c*1*k* is the controller which controls the emergency lamp (not shown) of Automobile 206. Cruise Control Controller 20665*c*1*l* is the controller which controls the cruise control (not shown) of Automobile 206. Speaker Volume Controller 20665*c*1*m* is the controller which controls the speaker (not shown) of Automobile 206. As another embodiment, the foregoing controllers may be in the form of hardware instead of software. The data stored in Automobile Controller Storage Area 20665*c*1 are primarily utilized for reinstallation, i.e., to reinstall the data to Automobile 835 (FIG. 1588) as described hereinafter in case the data stored in Automobile 835** are corrupted or lost.

FIG. 1611 illustrates the software programs stored in Remote Controlling Software Storage Area **20665*c*2 (FIG. 1601). As described in the present drawing, Remote Controlling Software Storage Area 20665*c*2 stores Engine Controlling Software 20665*c*2*a*, Direction Controlling Software 20665*c*2*b*, Speed Controlling Software 20665*c*2*c*, Window Controlling Software 20665*c*2*d*, Door Controlling Software 20665*c*2*e*, Radio Controlling Software 20665*c*2*f*, TV Controlling Software 20665*c*2*g*, Radio Channel Selecting Software 20665*c*2*h*, TV Channel Selecting Software 20665*c*2*i*, Blinker Controlling Software 20665*c*2*j*, Emergency Lamp Controlling Software 20665*c*2*k*, Cruise Control Controlling Software 20665*c*2*l*, Speaker Volume Controlling Software 20665*c*2*m*, Controller Reinstalling Software 20665*c*2*n*, Data Reinstalling Software 20665*c*2*o*, and User Access Authenticating Software 20665*c*2*p*. Engine Controlling Software 20665*c*2*a* is the software program described in FIG. 1613. Direction Controlling Software 20665*c*2*b* is the software program described in FIG. 1614. Speed Controlling Software 20665*c*2*c* is the software program described in FIG. 1615. Window Controlling Software 20665*c*2*d* is the software program described in FIG. 1616. Door Controlling Software 20665*c*2*e* is the software program described in FIG. 1617. Radio Controlling Software 20665*c*2*f* is the software program described in FIG. 1618. TV Controlling Software 20665*c*2*g* is the software program described in FIG. 1619. Radio Channel Selecting Software 20665*c*2*h* is the software program described in FIG. 1620. TV Channel Selecting Software 20665*c*2*i* is the software program described in FIG. 1621. Blinker Controlling Software 20665*c*2*j* is the software program described in FIG. 1622. Emergency Lamp Controlling Software 20665*c*2*k* is the software program described in FIG. 1623. Cruise Control Controlling Software 20665*c*2*l* is the software program described in FIG. 1624. Speaker Volume Controlling Software 20665*c*2*m* is the software program described in FIG. 1625. Controller Reinstalling Software 20665*c*2*n* is the software program described in FIG. 1626. Data Reinstalling Software 20665*c*2*o* is the software program described in FIG. 1627. User Access Authenticating Software 20665*c*2*p* is the software program described in FIG. 1612. The controllers stored in Automobile Controller Storage Area 83565*c*1 primarily functions as directly controlling Automobile 835 in the manner described in FIG. 1598, and the software programs stored in Remote Controlling Software Storage Area 83565*c*2 (FIG. 1611) controls the controllers stored in Automobile Controller Storage Area 83565*c*1 (FIG. 1598), by cooperating with the software programs stored in Remote Controlling Software Storage Area 83565*c*2 (FIG. 1599) of Automobile 835, in a wireless fashion via Antenna 218 (FIG. 1**).

FIG. 1612 illustrates User Access Authenticating Software **83565*c*2*p* (FIG. 1599) of Automobile 835 (FIG. 1588) and User Access Authenticating Software 20665*c*2*p* (FIG. 1611) of Communication Device 200, which determine whether Communication Device 200 in question is authorized to remotely control Automobile 835 by implementing the present function. As described in the present drawing, the user of Communication Device 200 inputs the user ID and the password data by utilizing Input Device 210 (FIG. 1) or via voice recognition system. The user ID and the password data are temporarily stored in User Acess Data Storage Area 20665*b*1 (FIG. 1603) from which the two data are sent to Automobile 835 (S1). Assume that the user input 'User#1' as the user ID and 'Password Data#1' as the password data. Upon receiving the user ID and the password data (in the present example, User#1 and Password Data#1) from Communication Device 200, Automobile 835 stores the two data in Work Area 83565*b*7 (FIG. 1590) (S2). Automobile 835 then initiates the authentication process to determine whether Communication Device 200 in question is authorized to remotely control Automobile 835 by referring to the data stored in User Acess Data Storage Area 83565*b*1 (FIG. 1591) (S3). Assume that the authenticity of Communication Device 200 in question is cleared. Automobile 835 permits Communication Device 200 in question to remotely control Automobile 835 in the manner described hereinafter (S4**).

FIG. 1613 illustrates Engine Controlling Software **83565*c*2*a* (FIG. 1599) of Automobile 835 (FIG. 1588) and Engine Controlling Software 20665*c*2*a* (FIG. 1611) of Communication Device 200, which ignite or turn off the engine (not shown) of Automobile 835. As described in the present drawing, the user of Communication Device 200 inputs an engine controlling signal by utilizing Input Device 210 (FIG. 1) or via voice recognition system. The signal is sent to Automobile 835 (S1). Here, the engine controlling signal indicates either to ignite the engine or turn off the engine. Upon receiving the engine controlling signal from Communication Device 200, Automobile 835 stores the signal in Work Area 83565*b*7 (FIG. 1590) (S2). Automobile 835 controls the engine (not shown) via Engine Controller 83565*c*1*a* (FIG. 1598) in accordance with the engine controlling signal (S3**).

FIG. 1614 illustrates Direction Controlling Software **83565*c*2*b* (FIG. 1599) of Automobile 835 (FIG. 1588) and Direction Controlling Software 20665*c*2*b* (FIG. 1611) of Communication Device 200, which control the direction of Automobile 835. As described in the present drawing, the user of Communication Device 200 inputs a direction controlling signal by utilizing Input Device 210 (FIG. 1) or via voice recognition system. The signal is sent to Automobile 835 (S1). Here, the direction controlling signal indicates either to move forward, back, left, or right Automobile 835. Upon receiving the direction controlling signal from Communication Device 200, Automobile 835 stores the signal in Work Area 83565*b*7 (FIG. 1590) (S2). Automobile 835 controls the direction via Direction Controller 83565*c*1*b* (FIG. 1598) in accordance with the direction controlling signal (S3**).

FIG. 1615 illustrates Speed Controlling Software **83565*c*2*c* (FIG. 1599) of Automobile 835 (FIG. 1588) and Speed Controlling Software 20665*c*2*c* (FIG. 1611) of Communication Device 200, which control the speed of Automobile 835. As described in the present drawing, the user of Communication Device 200 inputs a speed controlling signal by utilizing Input Device 210 (FIG. 1) or via voice recognition system. The signal is sent to Automobile 835 (S1). Here, the speed controlling signal indicates either to increase speed or decrease speed of Automobile 835. Upon receiving the speed controlling signal from Communication Device 200, Automobile 835 stores the signal in Work Area 83565*b*7 (FIG. 1590) (S2). Automobile 835 controls the speed via Speed Controller 83565*c*1*c* (FIG. 1598) In accordance the with speed controlling signal (S3**).

FIG. 1616 illustrates Window Controlling Software **83565*c*2*d* (FIG. 1599) of Automobile 835 (FIG. 1588) and Window Controlling Software 20665*c*2*d* (FIG. 1611) of Communication Device 200, which control the window (not shown) of Automobile 835. As described in the present drawing, CPU 211 (FIG. 1) of Communication Device 200 retrieves all window data from Window Data Storage Area 20665*b*2 (FIG. 1604) and displays the data on LCD 201 (FIG. 1) (S1). The user of Communication Device 200 selects one of the window data (for example, Window Data#1), and CPU 211 identifies the corresponding window ID (for example, Window#1) by referring to Window Data Storage Area 20665*b*2 (FIG. 1604) (S2). The user further inputs a window controlling signal by utilizing Input Device 210 (FIG. 1) or via voice recognition system (S3). Here, the window controlling signal indicates either to open the window or to close the window. CPU 211 sends the window ID and the window controlling signal to Automobile 835 (S4). Upon receiving the window ID and the window controlling signal from Communication Device 200, Automobile 835 stores both data in Work Area 83565*b*7 (FIG. 1590) (S5). Automobile 835 controls the window identified by the window ID via Window Controller 83565*c*1*d* (FIG. 1598) in accordance with the window controlling signal (S6**).

FIG. 1617 illustrates Door Controlling Software **83565*c*2*e* (FIG. 1599) of Automobile 835 (FIG. 1588) and Door Controlling Software 20665*c*2*e* (FIG. 1611) of Communication Device 200, which control the door (not shown) of Automobile 835. As described in the present drawing, CPU 211 (FIG. 1) of Communication Device 200 retrieves all door data from Door Data Storage Area 20665*b*3 (FIG. 1605) and displays the data on LCD 201 (FIG. 1) (S1). The user of Communication Device 200 selects one of the door data (for example, Door Data#1), and CPU 211 identifies the corresponding door ID (for example, Door#1) by referring to Door Data Storage Area 20665*b*3 (FIG. 1605) (S2). The user further inputs a door controlling signal by utilizing Input Device 210 (FIG. 1) or via voice recognition system. Here, the door controlling signal indicates either to open the door or to close the door (S3). CPU 211 sends the door ID and the door controlling signal to Automobile 835 (S4). Upon receiving the door ID and the door controlling signal from Communication Device 200, Automobile 835 stores both data in Work Area 83565*b*7 (FIG. 1590) (S5). Automobile 835 controls the door identified by the door ID via Door Controller 83565*c*1*e* (FIG. 1598) in accordance with the door controlling signal (S6**).

FIG. 1618 illustrates Radio Controlling Software **83565*c*2*f* (FIG. 1599) of Automobile 835 (FIG. 1588) and Radio Controlling Software 20665*c*2*f* (FIG. 1611) of Communication Device 200, which turn on or turn off the radio (not shown) installed in Automobile 835. As described in the present drawing, the user of Communication Device 200 inputs a radio controlling signal, and CPU 211 sends the signal to Automobile 835 (S1). Here, the radio controlling signal indicates either to turn on the radio or to turn off the radio. Upon receiving the radio controlling signal from Communication Device 200, Automobile 835 stores the signal in Work Area 83565*b*7 (FIG. 1590) (S2). Automobile 835 controls the radio via Radio Controller 83565*c*1*f* (FIG. 1598) in accordance with the radio controlling signal (S3**).

FIG. 1619 illustrates TV Controlling Software **83565*c*2*g* (FIG. 1599) of Automobile 835 (FIG. 1588) and TV Controlling Software 20665*c*2*g* (FIG. 1611) of Communication Device 200**, which turn on or turn off the TV (not shown)

installed in Automobile 835. As described in the present drawing, the user of Communication Device 200 inputs a TV controlling signal, and CPU 211 (FIG. 1) sends the signal to Automobile 835 (S1). Here, the TV controlling signal indicates either to turn on the TV or to turn off the TV. Upon receiving the TV controlling signal from Communication Device 200, Automobile 835 stores the signal in Work Area 83565*b*7 (FIG. 1590) (S2). Automobile 835 controls the TV via TV Controller 83565*c*1*g* (FIG. 1598) in accordance with the TV controlling signal (S3).

FIG. 1620 illustrates Radio Channel Selecting Software 83565*c*2*h* (FIG. 1599) of Automobile 835 (FIG. 1588) and Radio Channel Selecting Software 20665*c*2*h* (FIG. 1611) of Communication Device 200, which select the channel of the radio (not shown) installed in Automobile 835. As described in the present drawing, CPU 211 (FIG. 1) of Communication Device 200 retrieves all radio channel data from Radio Channel Data Storage Area 20665*b*4 (FIG. 1606) and Displays the data on LCD 201 (FIG. 1) (S1). The user of Communication Device 200 selects one of the radio channel data (for example, Radio Channel Data#1), and CPU 211 identifies the corresponding radio channel ID (for example, Radio Channel#1) by referring to Radio Channel Data Storage Area 20665*b*4 (FIG. 1606) (S2). CPU 211 sends the radio channel ID and the radio channel controlling signal to Automobile 835 (S3). Here, the radio channel controlling signal indicates to change the radio channel to the one identified by the radio channel ID. Upon receiving the radio channel ID and the radio channel controlling signal from Communication Device 200, Automobile 835 stores both data in Work Area 83565*b*7 (FIG. 1590) (S4). Automobile 835 controls the radio channel of the radio via Radio Channel Selector 83565*c*1*h* (FIG. 1598) in accordance with the Radio Channel Controlling Signal (S5).

FIG. 1621 illustrates TV Channel Selecting Software 83565*c*2*i* (FIG. 1599) of Automobile 835 (FIG. 1588) and TV Channel Selecting Software 20665*c*2*i* (FIG. 1611) of Communication Device 200, which select the channel of the TV (not shown) installed in Automobile 835. As described in the present drawing, CPU 211 (FIG. 1) of Communication Device 200 retrieves all TV channel data from TV Channel Data Storage Area 20665*b*5 (FIG. 1607) and displays the data on LCD 201 (FIG. 1) (S1). The user of Communication Device 200 selects one of the TV channel data, and CPU 211 identifies the corresponding TV channel ID (for example, TV Channel#1) by referring to TV Channel Data Storage Area 20665*b*5 (FIG. 1607) (S2). CPU 211 sends the TV channel ID and the TV channel controlling signal to Automobile 835 (S3). Here, the TV channel controlling signal indicates to change the TV channel to the one identified by the TV channel ID. Upon receiving the TV channel ID and the TV channel controlling signal from Communication Device 200, Automobile 835 stores both data in Work Area 83565*b*7 (FIG. 1590) (S4). Automobile 835 controls the TV Channel via TV Channel Selector 83565*c*1*i* (FIG. 1598) in accordance with the TV channel controlling signal (S5).

FIG. 1622 illustrates Blinker Controlling Software 83565*c*2*j* (FIG. 1599) of Automobile 835 (FIG. 1588) and Blinker Controlling Software 20665*c*2*j* (FIG. 1611) of Communication Device 200, which turn on or turn off the blinker (not shown) of Automobile 835. As described in the present drawing, CPU 211 (FIG. 1) of Communication Device 200 retrieves all blinker data from Blinker Data Storage Area 20665*b*6 (FIG. 1608) and displays the data on LCD 201 (FIG. 1) (S1). The user of Communication Device 200 selects one of the blinker data, and CPU 211 identifies the corresponding blinker ID (for example Blinker#1) by referring to Blinker Data Storage Area 20665*b*6 (FIG. 1608) (S2). CPU 211 sends the blinker ID and the blinker controlling signal to Automobile 835 (S3). Here, the blinker controlling signal indicates either to turn on or turn off the blinker identified by the blinker ID. Upon receiving the blinker ID and the blinker controlling signal from Communication Device 200, Automobile 835 stores both data in Work Area 83565*b*7 (FIG. 1590) (S4). Automobile 835 controls the blinker via Blinker Controller 20665*c*1*j* in accordance with the blinker controlling signal (S5).

FIG. 1623 illustrates Emergency Lamp Controlling Software 83565*c*2*k* (FIG. 1599) of Automobile 835 (FIG. 1588) and Emergency Lamp Controlling Software 20665*c*2*k* (FIG. 1611) of Communication Device 200, which turn on or turn off the emergency lamp (not shown) installed in Automobile 835. As described in the present drawing, the user of Communication Device 200 inputs an emergency lamp controlling signal, and CPU 211 (FIG. 1) sends the signal to Automobile 835 (S1). Here, the emergency lamp controlling signal indicates either to turn on the emergency lamp or to turn off the emergency lamp. Upon receiving the emergency lamp controlling signal from Communication Device 200, Automobile 835 stores the signal in Work Area 83565*b*7 (FIG. 1590) (S2). Automobile 835 controls the emergency lamp via Emergency Lamp Controller 83565*c*1*k* (FIG. 1598) in accordance with the emergency lamp controlling signal (S3).

FIG. 1624 illustrates Cruise Control Controlling Software 83565*c*2*l* (FIG. 1599) of Automobile 835 (FIG. 1588) and Cruise Control Controlling Software 20665*c*2*l* (FIG. 1611) of Communication Device 200, which turn on or turn off the cruise control (not shown) of Automobile 835. As described in the present drawing, the user of Communication Device 200 inputs a cruise control controlling signal, and CPU 211 (FIG. 1) sends the signal to Automobile 835 (S1). Here, the cruise control controlling signal indicates either to turn on the cruise control or turn off the cruise control. Upon receiving the cruise control controlling signal from Communication Device 200, Automobile 835 stores the signal in Work Area 83565*b*7 (FIG. 1590) (S2). Automobile 835 controls the cruise control via Cruise Control Controller 83565*c*1*l* (FIG. 1598) in accordance with the cruise control controlling signal (S3).

FIG. 1625 illustrates Speaker Volume Controlling Software 83565*c*2*m* (FIG. 1599) of Automobile 835 (FIG. 1588) and Speaker Volume Controlling Software 20665*c*2*m* (FIG. 1611) of Communication Device 200, which raise or lower the volume of the speaker (not shown) of Automobile 835. As described in the present drawing, the user of Communication Device 200 inputs a speaker volume controlling signal, and CPU 211 (FIG. 1) sends the signal to Automobile 835 (S1). Here, the speaker volume controlling signal indicates either to raise the volume or lower the volume of the speaker. Upon receiving the speaker volume controlling signal from Communication Device 200, Automobile 835 stores the signal in Work Area 83565*b*7 (FIG. 1590) (S2). Automobile 835 controls the speaker volume of the speaker via Speaker Volume Controller 83565*c*1*m* (FIG. 1598) in accordance with the speaker volume controlling signal (S3).

FIG. 1626 illustrates Controller Reinstalling Software 83565*c*2*n* (FIG. 1599) of Automobile 835 (FIG. 1588) and Controller Reinstalling Software 20665*c*2*n* (FIG. 1611) of Communication Device 200, which reinstalls the controllers to Automobile Controller Storage Area 83565*c*1. As described in the present drawing, CPU 211 (FIG. 1) of Communication Device 200 retrieves all controllers from Automobile Controller Storage Area 20665*c*1, and sends the controllers to Automobile 835 (S1). Upon receiving the controllers from Communication Device 200, Automobile

835 stores the controllers in Work Area **83565*b*7 (FIG. 1590) (S2). Automobile 835 then reinstalls the controllers in Automobile Controller Storage Area 83565*c*1 (S3**).

FIG. 1627 illustrates Data Reinstalling Software **83565*c*2*o* (FIG. 1599) of Automobile 835 (FIG. 1588) and Data Reinstalling Software 20665*c*2*o* (FIG. 1611) of Communication Device 200, which reinstall the data to Automobile Controlling Data Storage Area 20665*b*. As described in the present drawing, Automobile 835 retrieves all data from Automobile Controlling Data Storage Area 83565*b*, and sends the data to Communication Device 200 (S1). Upon receiving the data from Automobile 835, CPU 211 (FIG. 1) of Communication Device 200 stores the data in Work Area 20665*b*7 (S2). CPU 211 then reinstalls the data in Automobile Controlling Data Storage Area 20665*b* (S3**).

For the avoidance of doubt, Automobile 835 (FIG. 1588) is not limited to an automobile or a car; the present function may be implemented with any type of carrier or vehicle, such as airplane, space ship, artificial satellite, space station, train, and motor cycle.

<<Automobile Controlling Function—Summary>>

(1) A communication device comprising a microphone, a speaker, a display, an input device, and a multiple mode implementer, wherein said multiple mode implementer implements a voice communication mode and an automobile controlling mode, a series of audio data are input to and output from said microphone and said speaker respectively thereby enabling the user of said communication device to voice communicate with another person when said voice communication mode is implemented, said communication device remotely controls, in response to an automobile controlling signal input to said input device, an automobile when said automobile controlling mode is implemented.

(2) An automobile controlling system comprising a communication device and an automobile, wherein said communication device comprises a microphone, a speaker, a display, an input device, and a multiple mode implementer, said multiple mode implementer implements a voice communication mode and an automobile controlling mode, a series of audio data are input to and output from said microphone and said speaker respectively thereby enabling the user of said communication device to voice communicate with another person when said voice communication mode is implemented, said communication device remotely controls, in response to an automobile controlling signal input to said input device, said automobile in when said automobile controlling mode is implemented.

(3) An automobile controlling software program which remotely controls an automobile by a communication device, wherein said communication device comprise a microphone, a speaker, a display, an input device, said communication device remotely controls, in response to an automobile controlling signal input to said input device, said automobile under the control of said automobile controlling software program.

<<OCR Function>>

FIG. 1628 illustrates the storage area included in RAM 206 (FIG. 1). As described in the present drawing, RAM 206 includes OCR Information Storage Area **20666*a* of which the data and the software programs stored therein are described in FIG. 1629**.

The data and software programs stored in OCR Information Storage Area **20666*a* (FIG. 1628) are downloaded from Host H (FIG. 429) in the manner described in FIGS. 401 through 407**.

FIG. 1629 illustrates the storage areas included in OCR Information Storage Area **20666*a* (FIG. 1628). As described in the present drawing, OCR Information Storage Area 20666*a* includes OCR Data Storage Area 20666*b* and OCR Software Storage Area 20666*c*. OCR Data Storage Area 20666*b* stores the data necessary to implement the present function, such as the ones described in FIGS. 1630 through 1635. OCR Software Storage Area 20666*c* stores the software programs necessary to implement the present function, such as the ones described in FIGS. 1636*a* and 1636*b***.

FIG. 1630 illustrates the storage areas included in OCR Data Storage Area **20666*b* (FIG. 1629). As described in the present drawing, OCR Data Storage Area 20666*b* includes Web Address Data Storage Area 20666*b*1, Email Address Data Storage Area 20666*b*2, Phone Data Storage Area 20666*b*3, Alphanumeric Data Storage Area 20666*b*4, Image Data Storage Area 20666*b*5, and Work Area 20666*b*6. Web Address Data Storage Area 20666*b*1 stores the data described in FIG. 1631. Email Address Data Storage Area 20666*b*2 stores the data described in FIG. 1632. Phone Data Storage Area 20666*b*3 stores the data described in FIG. 1633. Alphanumeric Data Storage Area 20666*b*4 stores the data described in FIG. 1634. Image Data Storage Area 20666*b*5 stores the data described in FIG. 1635. Work Area 20666*b*6** is utilized as a work area to perform calculation and temporarily store data.

FIG. 1631 illustrates the data stored in Web Address Data Storage Area **20666*b*1 (FIG. 1630). As described in the present drawing, Web Address Data Storage Area 20666*b*1 comprises two columns, i.e., 'Web Address ID' and 'Web Address Data'. Column 'Web Address ID' stores the web address IDs, and each web address ID is the title of the corresponding web address data stored in column 'Web Address Data' utilized for identification purposes. Column 'Web Address Data' stores the web address data, and each web address data represents a web address composed of alphanumeric data of which the first portion thereof is 'http://'. In the example described in the present drawing, Web Address Data Storage Area 20666*b*1 stores the following data: the web address ID 'Web Address#1' and the corresponding web address data 'Web Address Data#1'; the web address ID 'Web Address#2' and the corresponding web address data 'Web Address Data#2'; the web address ID 'Web Address#3' and the corresponding web address data 'Web Address Data#3'; and the web address ID 'Web Address#4' and the corresponding web address data 'Web Address Data#4**'.

FIG. 1632 illustrates the data stored in Email Address Data Storage Area **20666*b*2 (FIG. 1630). As described in the present drawing, Email Address Data Storage Area 20666*b*2 comprises two columns, i.e., 'Email Address ID' and 'Email Address Data'. Column 'Email Address ID' stores the email address IDs, and each email address ID is the title of the corresponding email address data stored in column 'Email Address Data' utilized for identification purposes. Column 'Email Address Data' stores the email address data, and each email address data represents an email address composed of alphanumeric data which includes '@' mark therein. In the example described in the present drawing, Email Address Data Storage Area 20666*b*2 stores the following data: the email address ID 'Email Address#1' and the corresponding email address data 'Email Address Data#1'; the email address ID 'Email Address#2' and the corresponding email address data 'Email Address Data#2'; the email address ID 'Email Address#3' and the corresponding email address data 'Email Address Data#3'; and the email address ID 'Email Address#4' and the corresponding email address data 'Email Address Data#4**'.

FIG. 1633 illustrates the data stored in Phone Data Storage Area **20666*b*3 (FIG. 1630). As described in the present drawing, Phone Data Storage Area 20666*b*3 comprises two columns, i.e., ‘Phone ID’ and ‘Phone Data’. Column ‘Phone ID’ stores the phone IDs, and each phone ID is the title of the corresponding phone data stored in column ‘Phone Data’ utilized for identification purposes. Column ‘Phone Data’ stores the phone data, and each phone data represents a phone number composed of numeric figure of which the format is ‘xxx-xxx-xxxx’. In the example described in the present drawing, Phone Data Storage Area 20666*b*3 stores the following data: the phone ID ‘Phone#1’ and the corresponding phone data ‘Phone Data#1’; the phone ID ‘Phone#2’ and the corresponding phone data ‘Phone Data#2’; the phone ID ‘Phone#3’ and the corresponding phone data ‘Phone Data#3’; and the phone ID ‘Phone#4’ and the corresponding phone data ‘Phone Data#4**’.

FIG. 1634 illustrates the data stored in Alphanumeric Data Storage Area **20666*b*4 (FIG. 1630). As described in the present drawing, Alphanumeric Data Storage Area 20666*b*4 comprises two columns, i.e., ‘Alphanumeric ID’ and ‘Alphanumeric Data’. Column ‘Alphanumeric ID’ stores alphanumeric IDs, and each alphanumeric ID is the title of the corresponding alphanumeric data stored in column ‘Alphanumeric Data’ utilized for identification purposes. Column ‘Alphanumeric Data’ stores the alphanumeric data, and each alphanumeric data represents alphanumeric figure primarily composed of numbers, texts, words, and letters. In the example described in the present drawing, Alphanumeric Data Storage Area 20666*b*4 stores the following data: the alphanumeric ID ‘Alphanumeric#1’ and the corresponding alphanumeric data ‘Alphanumeric Data#1’; the alphanumeric ID ‘Alphanumeric#2’ and the corresponding alphanumeric data ‘Alphanumeric Data#2’; the alphanumeric ID ‘Alphanumeric#3’ and the corresponding alphanumeric data ‘Alphanumeric Data#3’; and the alphanumeric ID ‘Alphanumeric#4’ and the corresponding alphanumeric data ‘Alphanumeric Data#4**’.

FIG. 1635 illustrates the data stored in Image Data Storage Area **20666*b*5 (FIG. 1630). As described in the present drawing, Image Data Storage Area 20666*b*5 comprises two columns, i.e., ‘Image ID’ and ‘Image Data’. Column ‘Image ID’ stores the image IDs, and each image ID is the title of the corresponding image data stored in column ‘Image Data’ utilized for identification purposes. Column ‘Image Data’ stores the image data, and each image data is a data composed of image such as the image input via CCD Unit 214 (FIG. 1). In the example described in the present drawing, Image Data Storage Area 20666*b*5 stores the following data: the Image ID ‘Image#1’ and the corresponding Image Data ‘Image Data#1’; the Image ID ‘Image#2’ and the corresponding Image Data ‘Image Data#2’; the Image ID ‘Image#3’ and the corresponding Image Data ‘Image Data#3’; and the Image ID ‘Image#4’ and the corresponding Image Data ‘Image Data#4**’.

FIG. **1636*a* and 1636*b* illustrate the software programs stored in OCR Software Storage Area 20666*c* (FIG. 1629). As described in the present drawing, OCR Software Storage Area 20666*c* stores Image Data Scanning Software 20666*c*1, Image Data Storing Software 20666*c*2, OCR Software 20666*c*3, Alphanumeric Data Storing Software 20666*c*4, Web Address Data Identifying Software 20666*c*5*a*, Web Address Data Correcting Software 20666*c*5*b*, Web Address Data Storing Software 20666*c*5*c*, Address Accessing Software 20666*c*5*d*, Email Address Data Identifying Software 20666*c*6*a*, Email Address Data Correcting Software 20666*c*6*b*, Email Address Data Storing Software 20666*c*6*c*, Email Editting Software 20666*c*6*d*, Phone Data Identifying Software 20666*c*7*a*, Phone Data Correcting Software 20666*c*7*b*, Phone Data Storing Software 20666*c*7*c*, and Dialing Software 20666*c*7*d*. Image Data Scanning Software 20666*c*1 is the software program described in FIG. 1637. Image Data Storing Software 20666*c*2 is the software program described in FIG. 1638. OCR Software 20666*c*3 is the software program described in FIG. 1639. Alphanumeric Data Storing Software 20666*c*4 is the software program described in FIG. 1640. Web Address Data Identifying Software 20666*c*5*a* is the software program described in FIG. 1641. Web Address Data Correcting Software 20666*c*5*b* is the software program described in FIG. 1642. Web Address Data Storing Software 20666*c*5*c* is the software program described in FIG. 1643. Web Address Accessing Software 20666*c*5*d* is the software program described in FIG. 1644. Email Address Data Identifying Software 20666*c*6*a* is the software program described in FIG. 1645. Email Address Data Correcting Software 20666*c*6*b* is the software program described in FIG. 1646. Email Address Data Storing Software 20666*c*6*c* is the software program described in FIG. 1647. Email Editting Software 20666*c*6*d* is the software program described in FIG. 1648. Phone Data Identifying Software 20666*c*7*a* is the software program described in FIG. 1649. Phone Data Correcting Software 20666*c*7*b* is the software program described in FIG. 1650. Phone Data Storing Software 20666*c*7*c* is the software program described in FIG. 1651. Dialing Software 20666*c*7*d* is the software program described in FIG. 1652**.

FIG. 1637 illustrates Image Data Scanning Software **20666*c*1 (FIG. 1636*a*) of Communication Device 200, which scans an image by utilizing CCD Unit (FIG. 1). Referring to the present drawing, CPU 211 (FIG. 1) scans an image by utilizing CCD Unit (FIG. 1) (S1), and stores the extracted image data in Work Area 20666*b*6 (FIG. 1630) (S2). CPU 211 then retrieves the image data from Work Area 20666*b*6 (FIG. 1630) and displays the data on LCD 201 (FIG. 1) (S3**).

FIG. 1638 illustrates Image Data Storing Software **20666*c*2 (FIG. 1636*a*) of Communication Device 200, which stores the image data scanned by CCD Unit (FIG. 1). Referring to the present drawing, CPU 211 (FIG. 1) retrieves the image data from Work Area 20666*b*6 (FIG. 1630) and displays the data On LCD 201 (FIG. 1) (S1). The user of Communication Device 200 inputs an image ID, i.e., a title of the image data by utilizing Input Device 210 (FIG. 1) or via voice recognition system (S2). CPU 211 then stores the image ID and the image data in Image Data Storage Area 20666*b*5 (FIG. 1635) (S3**).

FIG. 1639 illustrates OCR Software **20666*c*3 (FIG. 1636*a*) of Communication Device 200, which extracts alphanumeric data from image data by utilizing the method so-called ‘optical character recognition’ or ‘OCR’. Referring to the present drawing, CPU 211 (FIG. 1) retrieves the image IDs from Image Data Storage Area 20666*b*5 (FIG. 1635) and displays the data on LCD 201 (FIG. 1) (S1). The user of Communication Device 200 selects one of the image IDs by utilizing Input Device 210 (FIG. 1) or via voice recognition system (S2). CPU 211 then retieves the image data of the image ID selected in S2 from Image Data Storage Area 20666*b*5 (FIG. 1635) and displays the image data on LCD 201 (FIG. 1) (S3). CPU 211 executes the OCR process, i.e., extracts alphanumeric data from the image data (S4), and stores the extracted alphanumeric data in Work Area 20666*b*6 (FIG. 1630) (S5**).

FIG. 1640 illustrates Alphanumeric Data Storing Software **20666*c*4 (FIG. 1636*a*) of Communication Device 200, which stores the extracted alphanumeric data in Alphanumeric Data Storage Area 20666*b*4 (FIG. 1634). Referring to the present drawing, the user of Communication Device 200 inputs an alphanumeric ID (i.e., the title of the alphanumeric data) (S1**).

CPU 211 (FIG. 1) then retrieves the alphanumeric data from Work Area **20666*b*6 (FIG. 1630) (S2), and stores the data in Alphanumeric Data Storage Area 20666*b*4 (FIG. 1634) with the Alphanumeric ID (S3**).

FIG. 1641 illustrates Web Address Data Identifying Software **20666*c*5*a* (FIG. 1636*a*) of Communication Device 200, which identifies the web address data among the Alphanumeric Data. Referring to the present drawing, CPU 211 (FIG. 1) retrieves the alphanumeric IDs from Alphanumeric Data Storage Area 20666*b*4 (FIG. 1634) and displays the alphanumeric IDs on LCD 201 (FIG. 1) (S1). The user of Communication Device 200 selects one of the Alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 1634) and displays the data on LCD 201 (FIG. 1) (S3). CPU 211 stores the alphanumeric data retrieved in S3 in Work Area 20666*b*6 (FIG. 1630) for the web address data identification explained in the next step (S4). CPU 211 scans the alphanumeric data, i.e., applies the web address criteria (for example, 'http://', 'www.', '.com', '.org', '.edu') to each alphanumeric data, and identifies the web address data included therein (S5). CPU 211 emphasizes the identified web address data by changing the font color (for example, blue) and drawing underlines to the identified web address data (S6). CPU 211 displays the alphanumeric data with the identified web address data emphasized on LCD 201 (FIG. 1) thereafter (S7**).

FIG. 1642 illustrates Web Address Data Correcting Software **20666*c*5*b* (FIG. 1636*a*) of Communication Device 200, which corrects the misidentified web address data by manually selecting the start point and the end point of the web address data. For example, if the web address data is misidentified as 'www.yahoo' and leaves out the remaining '.com', the user of Communication Device 200 may manually correct the web address data by selecting the start point and the end point of 'www.yaoo.com'. Referring to the present drawing, CPU 211 (FIG. 1) displays the alphanumeric data with web address data emphasized (S1). The user of Communication Device 200 selects the start point of the web address data (S2) and the end point of the web address data by utilizing Input Device 210 (FIG. 1) or via voice recognition system (S3). CPU 211 then identifies the alphanumeric data located between the start point and the end point as web address data (S4), and emphasizes the web address data by changing the font color (for example, blue) and drawing underlines thereto (S5). The alphanumeric data with the web address data emphasized are displayed on LCD 201 (FIG. 1) thereafter (S6**).

FIG. 1643 illustrates Web Address Data Storing Software **20666*c*5*c* (FIG. 1636*a*) of Communication Device 200, which stores the web address data in Web Address Data Storage Area 20666*b*1 (FIG. 1631). Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system, and CPU 211 emphasizes the data (for example, change to bold font) (S2). The user then inputs the web address ID (the title of the web address data) (S3). CPU 211 stores the web address ID and the web address data in Web Address Data Storage Area 20666*b*1 (FIG. 1631) (S4**).

FIG. 1644 illustrates Web Address Accessing Software **20666*c*5*d* (FIG. 1636*a*) of Communication Device 200, which accesses the web site represented by the web address data. Referring to the present drawing, CPU 211 (FIG. 1) displays the alphanumeric data with web address data emphasized (S1). The user of Communication Device 200 selects one of the web address data by utilizing Input Device 210 (FIG. 1) or via voice recognition system (for example, click one of the web address data) (S2). CPU 211 then opens an internet browser (for example, the Internet Explorer) and enters the web address data selected in S2 therein (S3). CPU 211 accesses the web site thereafter (S4**).

FIG. 1645 illustrates Email Address Data Identifying Software **20666*c*6*a* (FIG. 1636*b*) of Communication Device 200, which identifies the email address data among the alphanumeric data. Referring to the present drawing, CPU 211 (FIG. 1) retrieves the alphanumeric IDs from Alphanumeric Data Storage Area 20666*b*4 (FIG. 1634) and displays the alphanumeric IDs on LCD 201 (FIG. 1) (S1). The user of Communication Device 200 selects one of the alphanumeric IDs by utilizing Input Device 210 (FIG. 1) or via voice recognition system (S2). CPU 211 retrieves the corresponding alphanumeric data from Alphanumeric Data Storage Area 20666*b*4 (FIG. 1634) and displays the data on LCD 201 (FIG. 1) (S3). CPU 211 stores the alphanumeric data retrieved in S3 in Work Area 20666*b*6 (FIG. 1630) for the email address data identification explained in the next step (S4). CPU 211 scans the alphanumeric data, i.e., applies the email address criteria (for example, '@') to each alphanumeric data, and identifies the email address data included therein (S5). CPU 211 emphasizes the identified email address data by changing the font color (for example, green) and drawing underlines to the identified email address data (S6). CPU 211 displays the alphanumeric data with the identified email address data emphasized on LCD 201 (FIG. 1) thereafter (S7**).

FIG. 1646 illustrates Email Address Data Correcting Software **20666*c*6*b* (FIG. 1636*b*) of Communication Device 200, which corrects the misidentified email address data by manually selecting the start point and the end point of the email address data. For example, if the email address data is misidentified as 'iwaofujisaki@yahoo' and leaves out the remaining '.com', the user of Communication Device 200 may manually correct the email address data by selecting the start point and the end point of 'iwaofujisaki@yaoo.com'. Referring to the present drawing, CPU 211 (FIG. 1) displays the alphanumeric data with email address data emphasized (S1). The user of Communication Device 200 selects the start point of the email address data (S2) and the end point of the email address data by utilizing Input Device 210 (FIG. 1) or via voice recognition system (S3). CPU 211 then identifies the alphanumeric data located between the start point and the end point as email address data (S4), and emphasizes the email address data by changing the font color (for example, green) and drawing underlines thereto (S5). The alphanumeric data with the email address data emphasized are displayed on LCD 201 (FIG. 1) thereafter (S6**).

FIG. 1647 illustrates Email Address Data Storing Software **20666*c*6*c* (FIG. 1636*b*) of Communication Device 200, which stores the email address data to Email Address Data Storage Area 20666*b*2 (FIG. 1632). Referring to the present drawing, CPU 211 (FIG. 1) displays the alphanumeric data with the email address data emphasized (S1). The user of Communication Device 200 selects one of the email address data, and CPU 211 emphasizes the data (for example, change to bold font) (S2). The user then inputs the email address ID (the title of the email address data) by utilizing Input Device 210 (FIG. 1) or via voice recognition system (S3). CPU 211 stores the email address ID and the email address data in Email Address Data Storage Area 20666*b*2 (FIG. 1632) (S4**).

FIG. 1648 illustrates Email Editting Software **20666*c*6*d* (FIG. 1636*b*) of Communication Device 200, which opens an email editor (for example, the Outlook Express) wherein the email address data is set as the receiver's address. Referring to the present drawing, CPU 211 (FIG. 1) displays the alphanumeric data with the email address data emphasized (S1). The user of Communication Device 200 selects one of the email address data (for example, click one of the email address data) by utilizing Input Device 210 (FIG. 1) or via voice recognition system (S2). CPU 211 then opens an email editor (for example, the Outlook Express) (S3), and sets the email address data selected in S2 as the receiver's address (S4**).

FIG. 1649 illustrates Phone Data Identifying Software 20666*c*7*a* (FIG. 1636*b*) of Communication Device 200, which identifies the phone data among the alphanumeric data. Referring to the present drawing, CPU 211 (FIG. 1) retrieves the alphanumeric IDs from Alphanumeric Data Storage Area 20666*b*4 (FIG. 1634) and displays the alphanumeric IDs on LCD 201 (FIG. 1) (S1). The user of Communication Device 200 selects one of the alphanumeric IDs (S2). CPU 211 retrieves the corresponding alphanumeric data from Alphanumeric Data Storage Area 20666*b*4 (FIG. 1634) and displays the data on LCD 201 (FIG. 1) (S3). CPU 211 stores the alphanumeric data retrieved in S3 in Work Area 20666*b*6 (FIG. 1630) for the phone data identification explained in the next step (S4). CPU 211 scans the alphanumeric data, i.e., applies the phone criteria (for example, numeric data with 'xxx-xxx-xxxx' format) to each alphanumeric data, and identifies the phone data included therein (S5). CPU 211 emphasizes the identified phone data by changing the font color (for example, yellow) and drawing underlines to the identified phone data (S6). CPU 211 displays the alphanumeric data with the identified phone data emphasized on LCD 201 (FIG. 1) thereafter (S7).

FIG. 1650 illustrates Phone Data Correcting Software 20666*c*7*b* (FIG. 1636*b*) of Communication Device 200, which corrects the misidentified phone data by manually selecting the start point and the end point of the phone data. For example, if the phone data is misidentified as '916-455-' and leaves out the remaining '1293', the user of Communication Device 200 may manually correct the phone data by selecting the start point and the end point of '916-455-1293'. Referring to the present drawing, CPU 211 (FIG. 1) displays the alphanumeric data with phone data emphasized (S1). The user of Communication Device 200 selects the start point of the phone data (S2) and the end point of the phone data by utilizing Input Device 210 (FIG. 1) or via voice recognition system (S3). CPU 211 then identifies the alphanumeric data located between the start point and the end point as phone data (S4), and emphasizes the phone data by changing the font color (for example, yellow) and drawing underlines thereto (S5). The alphanumeric data with the phone data emphasized are displayed on LCD 201 (FIG. 1) thereafter (S6).

FIG. 1651 illustrates Phone Data Storing Software 20666*c*7*c* (FIG. 1636*b*) of Communication Device 200, which stores the phone data to Phone Data Storage Area 20666*b*3 (FIG. 1633). Referring to the present drawing, CPU 211 (FIG. 1) displays the alphanumeric data with the phone data emphasized (S1). The user of Communication Device 200 selects one of the phone data, and CPU 211 emphasizes the data (for example, change to bold font) (S2). The user then inputs the phone ID (the title of the phone data) (S3). CPU 211 stores the phone ID and the phone data in Phone Data Storage Area 20666*b*3 (FIG. 1633) (S4).

FIG. 1652 illustrates Dialing Software 20666*c*7*d* (FIG. 1636*b*) of Communication Device 200, which opens a phone dialer and initiates a dialing process by utilizing the phone data. Referring to the present drawing, CPU 211 (FIG. 1) displays the alphanumeric data with the phone data emphasized (S1). The user of Communication Device 200 selects one of the phone data by utilizing Input Device 210 (FIG. 1) or via voice recognition system (for example, click one of the phone data) (S2). CPU 211 then opens a phone dialer (S3), and inputs the phone data selected in S2 (S4). A dialing process is initiated thereafter.

<<OCR Function—Summary>>

(1) A communication device comprising a microphone, a speaker, a display, an input device, a camera, and a multiple mode implementer, wherein said multiple mode implementer implements a voice communication mode and an OCR mode, a series of audio data are input to and output from said microphone and said speaker respectively thereby enabling the user of said communication device to voice communicate with another person when said voice communication mode is implemented, an image is input to said camera, one or more of alphanumeric data are extracted from said image data, and an identified data is identified among said one or more of alphanumeric data when said OCR mode is implemented.

(2) The communication device of summary (1), wherein said identified data is a web address data representing a web address.

(3) The communication device of summary (1), wherein said identified data is an email address data representing an email address.

(4) The communication device of summary (1), wherein said identified data is a phone data representing a phone number.

(5) An OCR software program stored in a host computer which is downloadable to a communication device, wherein said communication device comprises a microphone, a speaker, a display, an input device, a camera, and a multiple mode implementer, said multiple mode implementer implements a voice communication mode and an OCR mode, a series of audio data are input to and output from said microphone and said speaker respectively thereby enabling the user of said communication device to voice communicate with another person when said voice communication mode is implemented, an image is input to said camera, one or more of alphanumeric data are extracted from said image data, and an identified data is identified among said one or more of alphanumeric data when said OCR mode is implemented under the control of said OCR software program.

(6) The OCR software program of summary (5), wherein said identified data is a web address data representing a web address.

(7) The OCR software program of summary (5), wherein said identified data is an email address data representing an email address.

(8) The OCR software program of summary (5), wherein said identified data is a phone data representing a phone number.

<<Multiple Mode Implementing Function>>

FIGS. 395 through 400 illustrate the multiple mode implementing function of Communication Device 200 which enables to activate and implement a plurality of modes, functions, and/or systems described in this specification simultaneously. The modes, functions, and/or systems which can be activated and implemented simultaneously with other modes, functions, and/or systems are primarily the following: the voice communication mode (explained in FIG. 1), the voice recognition system (explained in FIGS. 5 and 19, and FIGS. 156 through 160), the positioning system (explained in FIGS. 20*a* through 32*e*, and FIGS. 161 through 182), the auto backup system (explained in FIGS. 33 through 37), the audio/video data capturing system (explained in FIGS. 39 through 44), the digital mirror function (1) (2) (explained in FIGS. 44*c* through 44*e*, and FIGS. 145 through 155), the caller ID system (explained in FIGS. 45 through 47), the stock purchase function (explained in FIGS. 48 through 52), the timer email function (explained in FIGS. 53*a* and 53*b*), the call blocking function (explained in FIGS. 54 through 56), the online payment function (explained in FIGS. 60 through 64), the navigation system (explained in FIGS. 65 through 74), the remote controlling system (explained in FIGS. 75 through 83), the cellular TV function (explained in FIGS. 88 through 135), the 3D video game function (explained in FIGS. 136 through 144, FIGS. 270 through 283 for the shooting video game function, and FIGS. 284 through 294 for the driving video game function), the mobile ignition key function (explained in FIGS. 183 through 201), the voice print authentication system (explained in FIGS. 202 through 211), the fingerprint authentication system (explained in FIGS. 212 through 221), the auto time adjust function (explained in FIGS. 222 through 224), video/phone mode (explained in FIGS. 225 through 242), call taxi function (explained in FIGS. 243 through 269), address book updating function (explained in FIGS. 295 through 312), batch address book updating function (explained in FIGS. 313 through 329*c*), batch scheduler updating function (explained in FIGS. 330 through 352), calculator function (explained in FIGS. 353 through 356), spreadsheet function (explained in FIGS. 357 through 360), word processing function (explained in FIGS. 361 through 373), TV remote controller function (explained in FIGS. 374 through 394), CD/PC inter-communicating function (explained in FIGS. 413 through 427), PDWR sound selecting function (explained in FIGS. 428 through 456), start up software function (explained in FIGS. 457 through 466), stereo audio data output function (explained in FIGS. 468 through 479), stereo visual data output function (explained in FIGS. 480 through 491), multiple signal processing function (explained in FIGS. 492 through 529), GPS pin-pointing function (explained in FIGS. 530 through 553), CCD bar code reader function (explained in FIGS. 568 through 579), online renting function (explained in FIGS. 580 through 633), SOS calling function (explained in FIGS. 634 through 645), PC remote controlling function (explained in FIGS. 651 through 670), PC remote downloading function (explained in FIGS. 671 through 701), audiovisual playback function (explained in FIGS. 702 through 716), audio playback function (explained in FIGS. 717 through 731), ticket purchasing function (explained in FIGS. 732 through 753), remote data erasing function (explained in FIGS. 754 through 774), business card function (explained in FIGS. 775 through 784), game vibrator function (explained in FIGS. 784 through 786), part-time job finding function (explained in FIGS. 787 through 801), parking lot finding function (explained in FIGS. 802 through 832), on demand TV function (explained in FIGS. 834 through 855), inter-communicating TV function (explained in FIGS. 856 through 882), display controlling function (explained in FIGS. 883 through 894), multiple party communicating function (explained in FIGS. 894*a* through 917), display brightness controlling function (explained in FIGS. 918 through 923), multiple party pin-pointing function (explained in FIGS. 924 through 950*f*), digital camera function (explained in FIGS. 951 through 968), and phone number linking function (explained in FIGS. 968*a* through 983). For the avoidance of doubt, other modes, functions, and systems not explained above can also be activated and implemented by the present function.

FIG. 395 illustrates the software programs stored in RAM 206 (FIG. 1) to implement the multiple mode implementing function (FIG. 1). As described in FIG. 395, RAM 206 includes Multiple Mode Implementer Storage Area 20690*a*. Multiple Mode Implementer Storage Area 20690*a* stores Multiple Mode Implementer 20690*b*, Mode List Displaying Software 20690*c*, Mode Selecting Software 20690*d*, Mode Activating Software 20690*e*, and Mode Implemention Repeater 20690*f*, all of which are software programs. Multiple Mode Implementer 20690*b* administers the overall implementation of the present function. One of the major tasks of Multiple Mode Implementer 20690*b* is to administer and control the timing and sequence of Mode List Displaying Software 20690*c*, Mode Selecting Software 20690*d*, Mode Activating Software 20690*e*, and Mode Implemention Repeater 20690*f*. For example, Multiple Mode Implementer 20690*b* executes them in the following order: Mode List Displaying Software 20690*c*, Mode Selecting Software 20690*d*, Mode Activating Software 20690*e*, and Mode Implemention Repeater 20690*f*. Mode List Displaying Software 20690*c* displays on LCD 201 (FIG. 1) a list of a certain amount or all modes, functions, and/or systems explained in this specification of which the sequence is explained in FIG. 396. Mode Selecting Software 20690*d* selects a certain amount or all modes, functions, and/or systems explained in this specification of which the sequence is explained in FIG. 397. Mode Activating Software 20690*e* activates a certain amount or all modes, functions, and/or systems selected by the Mode Selecting Software 20690*d* of which the sequence is explained in FIG. 398. Mode Implemention Repeater 20690*f* executes Multiple Mode Implementer 20690*b* which reactivates Mode List Displaying Software 20690*c*, Mode Selecting Software 20690*d*, Mode Activating Software 20690*e* of which the sequence is explained in FIG. 399.

FIG. 396 illustrates the sequence of Mode List Displaying Software 20690*c* (FIG. 395). Referring to FIG. 396, CPU 211 (FIG. 1), under the command of Mode List Displaying Software 20690*c*, displays a list of a certain amount or all modes, functions, and/or systems described in this specification on LCD 201 (FIG. 1).

FIG. 397 illustrates the sequence of Mode Selecting Software 20690*d* (FIG. 395). Referring to FIG. 397, the user of Communication Device 200 inputs an input signal by utilizing Input Device 210 (FIG. 1) or via voice recognition system identifying one of the modes, functions, and/or systems displayed on LCD 201 (FIG. 1) (S1), and CPU 211 (FIG. 1), under the command of Mode Selecting Software 20690*d*, interpretes the input signal and selects the corresponding mode, function, or system (S2).

FIG. 398 illustrates the sequence of Mode Activating Software 20690*e* (FIG. 395). Referring to FIG. 398, CPU 211 (FIG. 1), under the command of Mode Activating Software 20690*e*, activates the mode, function, or, system selected in S2 of FIG. 397. CPU 211 thereafter implements the activated mode, function, or system as described in the relevant drawings in this specification.

FIG. 399 illustrates the sequence of Mode Implemention Repeater 20690*f* (FIG. 395). Referring to FIG. 399, the user of Communication Device 200 inputs an input signal by utilizing Input Device 210 (FIG. 1) or via voice recognition system (S1). Once the activation of the selected mode, function, or system described in FIG. 398 hereinbefore is completed, and if the input signal indicates to repeat the process to activate another mode, function, or system (S2), CPU 211 (FIG. 1), under the command of Mode Implemention Repeater 20690*f*, executes Multiple Mode Implementer 20690*b* (FIG. 395), which reactivates Mode List Displaying Software 20690*c* (FIG. 395), Mode Selecting Software 20690*d* (FIG. 395), and Mode Activating Software 20690*e* (FIG. 395) to activate the second mode, function, or system while the first mode, function, or system is implemented by utilizing the method of so-called 'time sharing' (S3). Mode List Displaying Software 20690*c*, Mode Selecting Software 20690*d*, and Mode Activating Software 20690*e* can be repeatedly executed until all modes, function, and systems displayed on LCD 201 (FIG. 1) are selected and activated. The activation of modes, functions, and/or systems is not repeated if the input signal explained in S2 so indicates.

As another embodiment, Multiple Mode Implementer 20690*b*, Mode List Displaying Software 20690*c*, Mode Selecting Software 20690*d*, Mode Activating Software 20690*e*, and Mode Implemention Repeater 20690*f* described in FIG. 395 may be integrated into one software program, Multiple Mode Implementer 20690*b*, as described in FIG. 400. Referring to FIG. 400, CPU 211 (FIG. 1), first of all, displays a list of a certain amount or all modes, functions, and/or systems described in this specification on LCD 201 (FIG. 1) (S1). Next, the user of Communication Device 200 inputs an input signal by utilizing Input Device 210 (FIG. 1) or via voice recognition system identifying one of the modes, functions, and/or systems displayed on LCD 201 (S2), and CPU 211 interpretes the input signal and selects the corresponding mode, function, or system (S3). CPU 211 activates the mode, function, or system selected in S3, and thereafter implements the activated mode, function, or system as described in the relevant drawings in this specification (S4). Once the activation of the selected mode, function, or system described in S4 is completed, the user of Communication Device 200 inputs an input signal by utilizing Input Device 210 or via voice recognition system (S5). If the input signal indicates to repeat the process to activate another mode, function, or system (S6), CPU 211 repeats the steps S1 through S4 to activate the second mode, function, or system while the first mode, function, or system is implemented by utilizing the method so-called 'time sharing'. The steps of Si though S4 can be repeatedly executed until all modes, function, and systems displayed on LCD 201 are selected and activated. The activation of modes, functions, and/or systems is not repeated if the input signal explained in S5 so indicates. The examples of Multiple Mode Implementer 20690*b* of the second embodiment are described in FIGS. 137, 145, 156, 162, 171, 181*a*, 186, 202, 226, 243*a*, 296, 314, 332, 353, 357, and 361. As another embodiment, before or at the time one software program is activated, CPU 211 may, either automatically or manually, terminate the other software programs already activated in order to save the limited space of RAM 206, thereby allowing only one software program implemented at a time. For the avoidance of doubt, the meaning of each term 'mode(s)', 'function(s)', and 'system(s)' is equivalent to the others in this specification. Namely, the meaning of 'mode(s)' includes and is equivalent to that of 'function(s)' and 'system(s)', the meaning of 'function(s)' includes and is equivalent to that of 'mode(s)' and 'system(s)', and the meaning of 'system(s)' includes and is equivalent to that of 'mode(s)' and 'function(s)'. Therefore, even only mode(s) is expressly utilized in this specification, it impliedly includes function(s) and/or system(s) by its definition.

<<Multiple Software Download Function>>

FIGS. 401 through 407 illustrate the multiple software download function which enables Communication Device 200 to download a plurality of software programs simultaneously. All software programs, data, any any types of information to implement all modes, functions, and systems described in this specification are stored in a host or server from which Communication Device 200 can download.

FIG. 401 illustrates the software programs stored in RAM 206 (FIG. 1). As described in FIG. 401, RAM 206 includes Multiple Software Download Controller Storage Area 20691*a*. Multiple Software Download Controller Storage Area 20691*a* includes Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g*. Multiple Software Download Controller 20691*b* administers the overall implementation of the present function. One of the major tasks of Multiple Software Download Controller 20691*b* is to administer and control the timing and sequence of Download Software List Displaying Software 20691*c*, Download Software Selector 20691*d*, Download Software Storage Area Selector 20691*e*, Download Implementer 20691*f*, and Download Repeater 20691*g*. For example, Multiple Software Download Controller 20691*b* executes them in the following order: Download Software List Displaying Software 20691*c*, Download Software Selector 20691*d*, Download Software Storage Area Selector 20691*e*, Download Implementer 20691*f*, and Download Repeater 20691*g*. Download Software List Displaying Software 20691*c* displays on LCD 201 (FIG. 1) a list of a certain amount or all software programs necessary to implement the modes, functions, and/or systems explained in this specification of which the sequence is explained in FIG. 402 hereinafter. Download Software Selector 20691*d* selects one of the software programs displayed on LCD 201 of which the sequence is explained in FIG. 403 hereinafter. Download Software Storage Area Selector 20691*e* selects the storage area in RAM 206 where the downloaded software program is stored of which the sequence is explained in FIG. 404 hereinafter. Download Implementer 20691*f* implements the download process of the software program selected by Download Software Selector 20691*d* hereinbefore and stores the software program in the storagre area selected by Download Software Storage Area Selector 20691*e* hereinbefore of which the sequence is explained in FIG. 405 hereinafter. Download Repeater 20691*g* executes Multiple Software Download Controller 20691*b* which reactivates Download Software List Displaying Software 20691*c*, Download Software Selector 20691*d*, Download Software Storage Area Selector 20691*e*, and Download Implementer 20691*f* of which the sequence is explained in FIG. 405 hereinafter.

FIG. 402 illustrates the sequence of Download Software List Displaying Software 20691*c* (FIG. 401). Referring to FIG. 402, CPU 211 (FIG. 1), under the command of Download Software List Displaying Software 20691*c*, displays a list of a certain amount or all software programs to implement all modes, functions, and systems described in this specification on LCD 201 (FIG. 1).

FIG. 403 illustrates the sequence of Download Software Selector 20691*d* (FIG. 401). Referring to FIG. 403, the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20691*d*, interpretes the input signal and selects the corresponding software program (S2).

FIG. 404 illustrates the sequence of Download Software Storage Area Selector 20691*e* (FIG. 401). Referring to FIG. 404, CPU 211 (FIG. 1), under the command of Download Software Storage Area Selector 20691*e*, selects a specific storage area in RAM 206 (FIG. 1) where the downloaded software program is to be stored. The selection of the specific storage area in RAM 206 may be done automatically by CPU 211 or manually by the user of Communication Device 200 by utilizing Input Device 210 (FIG. 1) or via voice recognition system.

FIG. 405 illustrates the sequence of Download Implementer 20691*f* (FIG. 401). Referring to FIG. 405, CPU 211 (FIG. 1), under the command of Download Implementer 20691*f*, implements the download process of the software program selected by Download Software Selector 20691*d* (FIG. 403) and stores the software program in the storagre area selected by Download Software Storage Area Selector 20691*e* (FIG. 404).

FIG. 406 illustrates the sequence of Download Repeater 20691*g* (FIG. 401). Referring to FIG. 406, the user of Communication Device 200 inputs an input signal by utilizing Input Device 210 (FIG. 1) or via voice recognition system when the downloading process of the software program is completed (S1). If the input signal indicates to repeat the process to download another software program, CPU 211 (FIG. 1), under the command of Download Repeater 20691*g*, executes Multiple Software Download Controller 20691*b* (FIG. 401), which reactivates Download Software List Displaying Software 20691*c* (FIG. 401), Download Software Selector 20691*d* (FIG. 401), Download Software Storage Area Selector 20691*e* (FIG. 401), and Download Implementer 20691*f* (FIG. 401) to download the second software program while the downloading process of the first software program is still in progress by utilizing the method so-called 'time sharing' (S3). Download Software List Displaying Software 20691*c*, Download Software Selector 20691*d*, Download Software Storage Area Selector 20691*e*, and Download Implementer 20691*f* can be repeatedly executed until all software programs displayed on LCD 201 (FIG. 1) are selected and downloaded. The downloading process is not repeated if the input signal explained in S2 so indicates.

As another embodiment, as described in FIG. 407, Multiple Software Download Controller 20691*b*, Download Software List Displaying Software 20691*c*, Download Software Selector 20691*d*, Download Software Storage Area Selector 20691*e*, Download Implementer 20691*f*, and Download Repeater 20691*g* may be integrated into a single software program, Multiple Software Download Controller 20691*b*. First of all, CPU 211 (FIG. 1) displays a list of all software programs downloadable from a host or server on LCD 201 (FIG. 1) (S1). The user of Communication Device 200 inputs an input signal by utilizing Input Device 210 (FIG. 1) or via voice recognition system identifying one of the software programs displayed on LCD 201 (S2), and CPU 211 interpretes the input signal and selects the corresponding software program (S3) and selects the storage area in RAM 206 (FIG. 1) where the downloaded software program is to be stored (S4). The selection of the specific storage area in RAM 206 may be done automatically by CPU 211 or manually by the user of Communication Device 200 by utilizing Input Device 210 (FIG. 1) or via voice recognition system. CPU 211 then implements the download process of the software program selected in S3 and stores the software program in the storagre area selected in S4 (S5). The user of Communication Device 200 inputs an input signal by utilizing Input Device 210 or via voice recognition system when the activation of downloading process of the software program desecribed in S5 is completed (S6). If the input signal indicates to repeat the process to download another software program, CPU 211 repeats the steps of S1 through S5 to download the second software program while the downloading process of the first software program is still in progress by utilizing the method so-called 'time sharing' (S7). The steps of S1 through S5 can be repeated until all software programs displayed on LCD 201 are selected and downloaded. The downloading process is not repeated if the input signal explained in S6 so indicates.

For the avoidance of doubt, FIGS. 401 through 407 are also applicable to download data and any types of information other than software programs.

<<Selected Software Distributing Function>>

FIGS. 1376 through 1393*d* illustrate another illustration of the multiple software download function described in FIGS. 401 through 407 which enables Communication Device 200 to download a plurality of software programs simultaneously. The present function is implemented not only for downloading software programs to implement any mode, function, and system described in this specification; the present function is also implemented for downloading data and any type of information to implement any mode, function, and system described in this specification which are stored in Host H (FIG. 429) from which Communication Device 200 can download. For the avoidance of doubt, a reference to FIGS. 401 through 407 (e.g., referring to FIGS. 401 through 407 in parenthesis) automatically refers to FIGS. 1376 through 1393*d* in this specification; a reference to FIGS. 1376 through 1393*d* (e.g., referring to FIGS. 1376 through 1393*d* in parenthesis) automatically refers to FIGS. 401 through 407 in this specification.

FIG. 1376 illustrates the storage areas included in Host H (FIG. 429). As described in the present drawing, Host H includes Selected Software Distributing Information Storage Area H56*a* of which the data and the software programs stored therein are described in FIG. 1377.

FIG. 1377 illustrates the storage areas included in Selected Software Distributing Information Storage Area H56*a* (FIG. 1376). As described in the present drawing, Selected Software Distributing Information Storage Area H56*a* includes Selected Software Distributing Data Storage Area H56*b* and Selected Software Distributing Software Storage Area H56*c*. Selected Software Distributing Data Storage Area H56*b* stores the data necessary to implement the present function on the side of Host H, such as the ones described in FIGS. 1378 through 1380. Selected Software Distributing Software Storage Area H56*c* stores the software programs necessary to implement the present function on the side of Host H, such as the ones described in FIG. 1381.

FIG. 1378 illustrates the storage areas included in Selected Software Distributing Data Storage Area H56*b* (FIG. 1377). As described in the present drawing, Selected Software Distributing Data Storage Area H56*b* includes Software Title Storage Area H56*b*1, Software Data Storage Area H56*b*2, and Work Area H56*b*3. Software Title Storage Area H56*b*1 stores the data described in FIG. 1379. Software Data Storage Area H56*b*2 stores the data described in FIG. 1380. Work Area H56*b*3 is utilized as a work area to perform calculation and store data temporarily.

FIG. 1379 illustrates the data stored in Software Title Storage Area H56*b*1 (FIG. 1378). As described in the present drawing, Software Title Storage Area H56*b*1 comprises two columns, i.e., 'Software ID' and 'Software Title'. Column 'Software ID' stores the software IDs, and each software ID represents an identification of the corresponding software title stored in column 'Software Title'. Column 'Software Title' stores the title in text format of the software data of the corresponding software ID stored in column 'Software Data' described in FIG. 1380. In the example described in the present drawing, Software Title Storage Area H56*b*1 stores the following data: the software ID 'Software #1' and the corresponding software title 'Software Title #1'; the software ID 'Software #2' and the corresponding software title 'Software Title #2'; the software ID 'Software #3' and the corresponding software title 'Software Title #3'; the software ID 'Software #4' and the corresponding software title 'Software Title #4'; and the software ID 'Software #5' and the corresponding software title 'Software Title #5'.

FIG. 1380 illustrates the data stored in Software Data Storage Area H56*b*2 (FIG. 1378). As described in the present drawing, Software Data Storage Area H56*b*2 comprises two columns, i.e., 'Software ID' and 'Software Data'. Column 'Software ID' stores the software IDs, and each software ID represents an identification of the corresponding software title stored in column 'Software Data'. Column 'Software Data' stores the software data, and each software data is the software program (including data and any other information) to implement the function described in this specification. In the example described in the present drawing, Software Data Storage Area H56*b*2 stores the following data: the software ID 'Software #1' and the corresponding software data 'Software Data #1'; the software ID 'Software #2' and the corresponding software data 'Software Data #2'; the software ID 'Software #3' and the corresponding software data 'Software Data #3'; the software ID 'Software #4' and the corresponding software data 'Software Data #4'; and the software ID 'Software #5' and the corresponding software data 'Software Data #5'. Only five software data are described in the present drawing for purposes of explaining the present function; the number of the software data stored in Software Data Storage Area H56*b*2 (and the corresponding software title stored in Software Title Storage Area H56*b*1 (FIG. 1379) may be as many as the number of OLE_LINK1 the modes, functions, and systems OLE_LINK1 described in this specification).

FIG. 1381 illustrates the software programs stored in Selected Software Distributing Software Storage Area H56*c*. As described in the present drawing, Selected Software Distributing Software Storage Area H56*c* stores Download Software List Displaying Software H56*c*2 and Download Implementer H56*c*5. Download Software List Displaying Software H56*c*2 is the software program described in FIG. 1388. Download Implementer H56*c*5 is the software program described in FIG. 1391.

FIG. 1382 illustrates the storage areas included in RAM 206 (FIG. 1). As described in the present drawing, RAM 206 includes Selected Software Distributing Information Storage Area 20656*a* of which the data and the software programs stored therein are described in FIG. 1383.

FIG. 1383 illustrates the storage areas included in Selected Software Distributing Information Storage Area 20656*a* (FIG. 1382). As described in the present drawing, Selected Software Distributing Information Storage Area 20656*a* includes Selected Software Distributing Data Storage Area 20656*b* and Selected Software Distributing Software Storage Area 20656*c*. Selected Software Distributing Data Storage Area 20656*b* stores the data necessary to implement the present function on the side of Communication Device 200, such as the ones described in FIGS. 1384 through 1386. Selected Software Distributing Software Storage Area 20656*c* stores the software programs necessary to implement the present function on the side of Communication Device 200, such as the ones described in FIG. 1387.

FIG. 1384 illustrates the storage areas included in Selected Software Distributing Data Storage Area 20656*b* (FIG. 1383). As described in the present drawing, Selected Software Distributing Data Storage Area 20656*b* includes Software Title Storage Area 20656*b*1, Software Data Storage Area 20656*b*2, and Work Area 20656*b*3. Software Title Storage Area 20656*b*1 stores the data described in FIG. 1385. Software Data Storage Area 20656*b*2 stores the data described in FIG. 1386. Work Area 20656*b*3 is utilized as a work area to perform calculation and store data temporarily.

FIG. 1385 illustrates the data stored in Software Title Storage Area 20656*b*1 (FIG. 1384). As described in the present drawing, Software Title Storage Area 20656*b*1 comprises two columns, i.e., 'Software ID' and 'Software Title'. Column 'Software ID' stores the software IDs, and each software ID represents an identification of the corresponding software title stored in column 'Software Title'. Column 'Software Title' stores the title in text format of the software data of the corresponding software ID stored in column 'Software Data' described in FIG. 1386. In the example described in the present drawing, Software Title Storage Area 20656*b*1 stores the following data: the software ID 'Software #1' and the corresponding software title 'Software Title #1'; the software ID 'Software #2' and the corresponding software title 'Software Title #2'; the software ID 'Software #3' and the corresponding software title 'Software Title #3'; the software ID 'Software #4' and the corresponding software title 'Software Title #4'; and the software ID 'Software #5' and the corresponding software title 'Software Title #5'.

FIG. 1386 illustrates the data stored in Software Data Storage Area 20656*b*2 (FIG. 1384). As described in the present drawing, Software Data Storage Area 20656*b*2 comprises two columns, i.e., 'Software ID' and 'Software Data'. Column 'Software ID' stores the software IDs, and each software ID represents an identification of the corresponding software title stored in column 'Software Data'. Column 'Software Data' stores the software data, and each software data is the software program (including data and any other information) to implement the function described in this specification. In the example described in the present drawing, Software Data Storage Area 20656*b*2 stores the following data: the software ID 'Software #1' and the corresponding software data 'Software Data #1'; the software ID 'Software #2' and the corresponding software data 'Software Data #2'; the software ID 'Software #3' and the corresponding software data 'Software Data #3'; the software ID 'Software #4' with no corresponding software data; and the software ID 'Software #5' with no corresponding software data. Only few software data are described in the present drawing for purposes of explaining the present function; the number of the software data stored in Software Data Storage Area 20656*b*2 (and the corresponding software title stored in Software Title Storage Area 20656*b*1 (FIG. 1385) may be as many as the number of the modes, functions, and systems described in this specification).

FIG. 1387 illustrates the software programs stored in Selected Software Distributing Software Storage Area 20656*c*. As described in the present drawing, Selected Software Distributing Software Storage Area 20656*c* stores Multiple Software Download Controller 20656*c*1, Download Software List Displaying Software 20656*c*2, Download Software Selector 20656*c*3, Download Software Storage Area Selector 20656*c*4, Download Implementer 20656*c*5, and Download Repeater 20656*c*6. Multiple Software Download Controller 20656*c*1 is the software program described hereafter. Download Software List Displaying Software 20656*c*2 is the software program described in FIG. 1388. Download Software Selector 20656*c*3 is the software program described in FIG. 1389. Download Software Storage Area Selector 20656*c*4 is the software program described in FIG. 1390. Download Implementer 20656*c*5 is the software program described in FIG. 1391. Download Repeater 20656*c*6 is the software program described in FIG. 1392. Referring to Multiple Software Download Controller 20656*c*1, this software program administers the overall implementation of the present function. One of the major tasks of Multiple Software Download Controller 20656*c*1 is to administer and control the timing and sequence of Download Software List Displaying Software **20656*c*2, Download Software Selector 20656*c*3, Download Software Storage Area Selector 20656*c*4, Download Implementer 20656*c*5, and Download Repeater 20656*c*6. For example, Multiple Software Download Controller 20656*c*1 executes them in the following order: Download Software List Displaying Software 20656*c*2, Download Software Selector 20656*c*3, Download Software Storage Area Selector 20656*c*4, Download Implementer 20656*c*5, and Download Repeater 20656*c*6**.

FIG. 1388 illustrates Download Software List Displaying Software H**56*c*2 stored in Selected Software Distributing Software Storage Area H56*c* (FIG. 1381) of Host H (FIG. 429) and Download Software List Displaying Software 20656*c*2 stored in Selected Software Distributing Software Storage Area 20656*c* (FIG. 1387) of Communication Device 200, which displays on LCD 201 (FIG. 1) the titles of the software programs downloadable from Host H, which are necessary to implement the modes, functions, and/or systems explained in this specification. As described in the present drawing, CPU 211 (FIG. 1) of Communication Device 200 sends a software list request to Host H (S1). Upon receiving the software list request from Communication Device 200 (S2), Host H retrieves the software IDs and the software titles from Software Title Storage Area 20656*b*1 (FIG. 1385) (S3), which are sent to Communication Device 200 (S4). Upon receiving the software IDs and the software titles from Host H (S5), CPU 211 stores the data in Software Title Storage Area 20656*b*1 (FIG. 1385) (S6). CPU 211 retrieves the software IDs and the software titles from Software Title Storage Area 20656*b*1 (FIG. 1385) (S7), and displays the data on LCD 201 (S8). In the present example, the following data are retrieved from Software Title Storage Area H56*b*1 (FIG. 1379) of Host H and stored in Software Title Storage Area 20656*b*1 (FIG. 1385) of Communication Device 200: the software ID 'Software #1' and the corresponding software title 'Software Title #1'; the software ID 'Software #2' and the corresponding software title 'Software Title #2'; the software ID 'Software #3' and the corresponding software title 'Software Title #3'; the software ID 'Software #4' and the corresponding software title 'Software Title #4'; and the software ID 'Software #5' and the corresponding software title 'Software Title #5**'.

FIG. 1389 illustrates Download Software Selector **20656*c*3 stored in Selected Software Distributing Software Storage Area 20656*c* (FIG. 1387) of Communication Device 200, which selects the software program to be downloaded from Host H (FIG. 429). Referring to the present drawing, the user of Communication Device 200 inputs an input signal by utilizing Input Device 210 (FIG. 1) or via voice recognition system identifying one of the software programs displayed on LCD 201 (FIG. 1) (S1), and CPU 211, under the command of Download Software Selector 20656*c*3, interpretes the input signal and selects the corresponding software program (S2). CPU 211 stores the software ID of the selected software program in Work Area 20656*b*3 (FIG. 1384) (S3**).

FIG. 1390 illustrates Download Software Storage Area Selector **20656*c*4 stored in Selected Software Distributing Software Storage Area 20656*c* (FIG. 1387) of Communication Device 200, which selects the storage area in RAM 206 where the downloaded software program is stored. Referring to the present drawing, CPU 211 (FIG. 1), under the command of Download Software Storage Area Selector 20656*c*4, selects a specific storage area in RAM 206 (FIG. 1) where the downloaded software program is to be stored. The selection of the specific storage area in RAM 206 may be implemented automatically by CPU 211 or manually by the user of Communication Device 200 by utilizing Input Device 210 (FIG. 1**) or via voice recognition system.

FIG. 1391 illustrates Download Implementer **20656*c*5 stored in Selected Software Distributing Software Storage Area H56*c* (FIG. 1381) of Host H (FIG. 429) and Download Implementer 20656*c*5 stored in Selected Software Distributing Software Storage Area 20656*c* (FIG. 1387) of Communication Device 200, which implements the download process of the software program selected by Download Software Selector 20656*c*3 hereinbefore and stores the software program in the storagre area selected by Download Software Storage Area Selector 20656*c*4 hereinbefore. Referring to the present drawing, CPU 211 (FIG. 1) of Communication Device 200 retrieves the software ID of the selected software program from Work Area 20656*b*3 (FIG. 1384) (S1), and sends the software ID to Host H (S2). Upon receiving the software ID from Communication Device 200 (S3), Host H retrieves the corresponding software data from Software Data Storage Area 20656*b*2 (FIG. 1386) (S4), and sends the data to Communication Device 200 (S5). Upon receiving the software data from Host H (S6), Communication Device 200 stores the data in the storage area selected by Download Software Storage Area Selector 20656*c*4 (FIG. 1390) (S7**).

FIG. 1392 illustrates Download Repeater **20656*c*6 stored in Selected Software Distributing Software Storage Area 20656*c* (FIG. 1387) of Communication Device 200, which executes Multiple Software Download Controller 20656*c*1 which reactivates Download Software List Displaying Software 20656*c*2, Download Software Selector 20656*c*3, Download Software Storage Area Selector 20656*c*4, and Download Implementer 20656*c*5 in order to download another software program. Referring to the present drawing, the user of Communication Device 200 inputs an input signal by utilizing Input Device 210 (FIG. 1) or via voice recognition system (S1). The input signal can be input whether or not the downloading process of the software program is completed. Assuming that the process of the software program is not yet completed. If the input signal indicates to repeat the process to download another software program, CPU 211 (FIG. 1), under the command of Download Repeater 20656*c*6, executes Multiple Software Download Controller 20656*c*1, which reactivates Download Software List Displaying Software 20656*c*2, Download Software Selector 20656*c*3, Download Software Storage Area Selector 20656*c*4, and Download Implementer 20656*c*5 to download the second software program while the downloading process of the first software program is still in progress by utilizing the method so-called 'time sharing' (S3). Download Software List Displaying Software 20656*c*2, Download Software Selector 20656*c*3, Download Software Storage Area Selector 20656*c*4, and Download Implementer 20656*c*5 can be repeatedly executed until all software programs displayed on LCD 201 (FIG. 1) are selected and downloaded. The downloading process is not repeated if the input signal explained in S2** so indicates.

FIGS. **1393*a* through 1393*d* illustrate another embodiment of the sequence described in FIG. 1392. Multiple Software Download Controller 20656*c*1, Download Software List Displaying Software 20656*c*2, Download Software Selector 20656*c*3, Download Software Storage Area Selector 20656*c*4, Download Implementer 20656*c*5, and Download Repeater 20656*c*6 and integrated into one software program, i.e., Multiple Software Download Controller 20656*c*1. Referring to the present drawing, CPU 211 (FIG. 1) of Communication Device 200 sends a software list request to Host H (S1). Upon receiving the software list request from Communication Device 200 (S2), Host H retrieves the software IDs and the software titles from Software Title Storage Area 20656*b*1 (FIG. 1385) (S3), which are sent to Communication Device 200 (S4). Upon receiving the software IDs and the software titles from Host H (S5), CPU 211 stores the data in Software Title Storage Area 20656*b*1 (FIG. 1385) (S6). CPU 211 retrieves the software IDs and the software titles from Software Title Storage Area 20656*b*1 (FIG. 1385) (S7), and displays the data on LCD 201 (S8). In the present example, the following data are retrieved from Software Title Storage Area H56*b*1 (FIG. 1379) of Host H and stored in Software Title Storage Area 20656*b*1 (FIG. 1385) of Communication Device 200: the software ID 'Software #1' and the corresponding software title 'Software Title #1'; the software ID 'Software #2' and the corresponding software title 'Software Title #2'; the software ID 'Software #3' and the corresponding software title 'Software Title #3'; the software ID 'Software #4' and the corresponding software title 'Software Title #4'; and the software ID 'Software #5' and the corresponding software title 'Software Title #5'. Next, the user of Communication Device 200 inputs an input signal by utilizing Input Device 210 (FIG. 1) or via voice recognition system identifying one of the software programs displayed on LCD 201 (FIG. 1) (S9), and CPU 211 interpretes the input signal and selects the corresponding software program (S10). CPU 211 stores the software ID of the selected software program in Work Area 20656*b*3 (FIG. 1384) (S11). CPU 211 (FIG. 1) then selects a specific storage area in RAM 206 (FIG. 1) where the downloaded software program is to be stored (S12). The selection of the specific storage area in RAM 206 may be implemented automatically by CPU 211 or manually by the user of Communication Device 200 by utilizing Input Device 210 (FIG. 1) or via voice recognition system. CPU 211 (FIG. 1) of Communication Device 200 retrieves the software ID of the selected software from Work Area 20656*b*3 (FIG. 1384) (S13), and sends the software ID to Host H (S14). Upon receiving the software ID from Communication Device 200 (S15), Host H retrieves the corresponding software data from Software Data Storage Area 20656*b*2 (FIG. 1386) (S16), and sends the data to Communication Device 200 (S17). Upon receiving the software data from Host H (S18), Communication Device 200 stores the data in the storage area selected by Download Software Storage Area Selector 20656*c*4 (FIG. 1390) (S19). Next, the user of Communication Device 200 inputs an input signal by utilizing Input Device 210 (FIG. 1) or via voice recognition system (S20). The input signal can be input whether or not the downloading process of the software program is completed. Assuming that the process of the software program is not yet completed. If the input signal indicates to repeat the process to download another software program (S21), CPU 211 (FIG. 1), repeats the sequence from S8 to download the second software program while the downloading process of the first software program is still in progress by utilizing the method so-called 'time sharing' (S22). The sequence can be repeatedly executed until all software programs displayed on LCD 201 (FIG. 1) are selected and downloaded. The downloading process is not repeated if the input signal explained in S21** so indicates.

<<Multiple Software Download and Mode Implementation Function>>

FIGS. 408 through 412 illustrate the multiple software download and mode implementation function which enables Communication Device 200 to implement the multiple mode implementing function and the multiple software download function simultaneously. Namely, Communication Device 200 is capable of downloading a plurality of software programs and activating/implementing a plurality of modes, functions, and/or systems simultaneously.

FIG. 408 illustrates the software program stored in RAM 206 (FIG. 1). As described in FIG. 408, RAM 206 (FIG. 1) includes Multiple Software Download And Mode Activation Implementer Storage Area **20692*a*. Multiple Software Download And Mode Activation Implementer Storage Area 20692*a* stores Multiple Mode Implementer 20690*b*, Multiple Software Download And Mode Activation Implementer Storage Area Selector 20692*c*, Multiple Mode Implementer Activator 20692*d*, and Multiple Software Download Controller Activator 20692*e*, all of which are software programs. Multiple Software Download And Mode Activation Implementer 20692*b* administers the overall implementation of the present function. One of the major tasks of Multiple Software Download And Mode Activation Implementer 20692*b* is to administer and control the timing and sequence of Multiple Software Download And Mode Activation Implementer Storage Area Selector 20692*c*, Multiple Mode Implementer Activator 20692*d*, and Multiple Software Download Controller Activator 20692*e*. For example, Multiple Software Download And Mode Activation Implementer 20692*b* executes them in the following order: Multiple Software Download And Mode Activation Implementer Storage Area Selector 20692*c*, Multiple Mode Implementer Activator 20692*d*, and Multiple Software Download Controller Activator 20692*e*. Multiple Software Download And Mode Activation Implementer Storage Area Selector 20692*c* selects storage areas for implementing the multiple mode implementing function and the multiple software download function. Multiple Mode Implementer Activator 20692*d* activates Multiple Mode Implementer 20690*b* (FIG. 395) to implement the multiple mode implementing function. Multiple Software Download Controller Activator 20692*e* activates Multiple Software Download Controller 20691*b* (FIG. 401) to implement the multiple software download function. Both Multiple Mode Implementer Activator 20692*d* and Multiple Software Download Controller Activator 20692*e* can be executed simultaneously by the control of Multiple Software Download And Mode Activation Implementer 20692*b***.

FIG. 409 illustrates the sequence of Multiple Software Download And Mode Activation Implementer Storage Area Selector **20692*c* (FIG. 408). Referring to FIG. 409, CPU 211 (FIG. 1), under the command of Multiple Software Download And Mode Activation Implementer Storage Area Selector 20692*c*, selects a plurality of storage areas in RAM 206 (FIG. 1) to download a plurality of software programs and to activate a plurality of modes, functions, and/or systems simultaneously. Namely, CPU 211 selects one set of a plurality of storage areas in RAM 206 to implement the multiple mode implementing function of which the details are described in FIGS. 395 through 400, and also selects another set of a plurality of storage areas in RAM 206 to implement the multiple software download function of which the details are described in FIGS. 401 through 407. The selection of the plurality of storage areas in RAM 206 may be done automatically by CPU 211 or manually by the user of Communication Device 200 by utilizing Input Device 210 (FIG. 1**) or via voice recognition system.

FIG. 410 illustrates the sequence of Multiple Mode Implementer Activator **20692*d* (FIG. 408). Referring to FIG. 410, CPU 211 (FIG. 1), under the command of Multiple Mode Implementer Activator 20692*d*, activates Multiple Mode Implementer 20690*b* (FIG. 395) to implement the multiple mode implementing function of which the details are described in FIGS. 395 through 400**.

FIG. 411 illustrates the sequence of Multiple Software Download Controller Activator **20692*e* (FIG. 408). Referring to FIG. 411, CPU 211 (FIG. 1), under the command of Multiple Software Download Controller Activator 20692*e*, activates Multiple Software Download Controller 20691*b*** (FIG.

401) to implement the multiple software download function of which the details are described in FIGS. 401 through 407.

As another embodiment as described in FIG. 412, Multiple Software Download And Mode Activation Implementer 20692*b*, Multiple Software Download And Mode Activation Implementer Storage Area Selector 20692*c*, Multiple Mode Implementer Activator 20692*d*, and Multiple Software Download Controller Activator 20692*e*, described in FIG. 408, may be integrated into one single software program, Multiple Software Download And Mode Activation Implementer 20692*b*. Referring to FIG. 412, CPU 211 (FIG. 1), first of all, selects a plurality of storage areas in RAM 206 (FIG. 1) to download a plurality of software programs and to activate a plurality of modes, functions, and/or systems simultaneously (S1). Namely, CPU 211 selects one set of a plurality of storage areas in RAM 206 to implement the multiple mode implementing function and also selects another set of a plurality of storage areas in RAM 206 to implement the multiple software download function. The selection of the plurality of storage areas in RAM 206 may be done automatically by CPU 211 or manually by the user of Communication Device 200 by utilizing Input Device 210 (FIG. 1) or via voice recognition system. CPU 211 next activates Multiple Mode Implementer 20690*b* (FIG. 395) to implement the multiple mode implementing function of which the details are described in FIGS. 395 through 400 (S2*a*). At the same time, CPU 211 (FIG. 1) activates Multiple Software Download Controller 20691*b* (FIG. 401) to implement the multiple software download function of which the details are described in FIGS. 401 through 407.

For the avoidance of doubt, FIGS. 408 through 412 is also applicable to downloading data and any types of information other than downloading software programs.

Having thus described a presently preferred embodiment of the present invention, it will not be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims. For the avoidance of doubt, the applicant has no intent to surrender any equivalent of any element included in the claims by any amendment of the claims unless expressly and unambiguously stated otherwise in the amendment. Further, for the avoidance of doubt, the number of the prior arts introduced herein (and/or in IDS) may be of a large one, however, the applicant has no intent to hide the more relevent prior art(s) in the less relevant prior arts.

The invention claimed is:

1. A method for a communication device, said method comprising:

a phone communication device remote controlling step;

wherein said communication device is remotely controlled via a user instruction entered by a phone when said phone communication device remote controlling step is implemented, wherein in response to the user entering said user instruction by said phone, said communication device receives a communication device controlling command via a network to which said communication device is connected in a wireless fashion, and said communication device initiates a communication device controlling task in response to said communication device controlling command, and a communication device controlled notice is output from said phone, wherein said communication device controlled notice indicates whether said communication device has successfully accomplished said user instruction or not.

2. The method of claim 1, wherein said user instruction indicates to deactivate the silent mode of said communication device, and said communication device controlled notice indicates that the silent mode is deactivated, wherein a vibrator is activated in lieu of outputting an audio upon receiving a phone call when said silent mode is activated.

3. The method of claim 1, wherein said user instruction indicates to output audio data from said speaker of said communication device which is a mobile phone, and said communication device controlled notice indicates that audio data is output from said speaker.

4. The method of claim 1, wherein said user instruction indicates to change password pertaining to said communication device, and said communication device controlled notice indicates that password pertaining to said communication device is changed.

5. The method of claim 1, wherein said user instruction indicates to lock said communication device which is a mobile phone, and said communication device controlled notice indicates that said communication device is locked.

6. The method of claim 1, wherein said user instruction indicates to power off said communication device which is a mobile phone, and said communication device controlled notice indicates that said communication device is powered off.

7. A method for a communication device, said method comprising:

an internet communication device remote controlling step;

wherein said communication device is remotely controlled via a user instruction entered via the Internet when said internet communication device remote controlling step is implemented, wherein in response to the user entering said user instruction via the Internet, said communication device receives a communication device controlling command via a network to which said communication device is connected in a wireless fashion, and said communication device initiates a communication device controlling task in response to said communication device controlling command, and a communication device controlled notice is output via the Internet, wherein said communication device controlled notice indicates whether said communication device has successfully accomplished said user instruction or not.

8. The method of claim 7, wherein said user instruction indicates to deactivate the silent mode of said communication device, and said communication device controlled notice indicates that the silent mode is deactivated, wherein a vibrator is activated in lieu of outputting an audio upon receiving a phone call when said silent mode is activated.

9. The method of claim 7, wherein said user instruction indicates to deactivate the silent mode of said communication device and output audio data from said speaker, and said communication device controlled notice indicates that the silent mode is deactivated and audio data is output from said speaker, wherein a vibrator is activated in lieu of outputting an audio upon receiving a phone call when said silent mode is activated.

10. The method of claim 7, wherein said user instruction indicates to output audio data from said speaker of said communication device which is a mobile phone, and said communication device controlled notice indicates that audio data is output from said speaker.

11. The method of claim 7, wherein said user instruction indicates to change password pertaining to said communication device, and said communication device controlled notice indicates that password pertaining to said communication device is changed.

12. The method of claim 7, wherein said user instruction indicates to lock said communication device which is a mobile phone, and said communication device controlled notice indicates that said communication device is locked.

13. The method of claim 7, wherein said user instruction indicates to power off said communication device which is a mobile phone, and said communication device controlled notice indicates that said communication device is powered off.

14. A communication device remotely controlling system to control a communication device by phone or the Internet, wherein said communication device remotely controlling system includes a communication device remotely controlling means;

wherein, in response to a user instruction being entered by a phone or via the Internet by a user, said communication device remotely controlling means transmits a communication device controlling command, which is transferred to said communication device via a network to which said communication device is connected in a wireless fashion;

said communication device initiates a communication device controlling task in response to said communication device controlling command; and a communication device controlled notice is output from said phone or via the Internet, wherein said communication device controlled notice indicates whether said communication device has successfully accomplished said user instruction or not.

15. The system of claim 14, wherein said user instruction indicates to deactivate the silent mode of said communication device, and said communication device controlled notice indicates that the silent mode is deactivated, wherein a vibrator is activated in lieu of outputting an audio upon receiving a phone call when said silent mode is activated.

16. The system of claim 14, wherein said user instruction indicates to deactivate the silent mode of said communication device and output audio data from said speaker, and said communication device controlled notice indicates that the silent mode is deactivated and audio data is output from said speaker, wherein a vibrator is activated in lieu of outputting an audio upon receiving a phone call when said silent mode is activated.

17. The system of claim 14, wherein said user instruction indicates to output audio data from said speaker of said communication device which is a mobile phone, and said communication device controlled notice indicates that audio data is output from said speaker.

18. The system of claim 14, wherein said user instruction indicates to change password pertaining to said communication device, and said communication device controlled notice indicates that password pertaining to said communication device is changed.

19. The system of claim 14, wherein said user instruction indicates to lock said communication device which is a mobile phone, and said communication device controlled notice indicates that said communication device is locked.

20. The system of claim 14, wherein said user instruction indicates to power off said communication device which is a mobile phone, and said communication device controlled notice indicates that said communication device is powered off.

* * * * *